US005296935A

United States Patent [19]

Bresler

[11] Patent Number: 5,296,935

[45] Date of Patent: Mar. 22, 1994

[54] METHOD AND APPARATUS FOR CALIBRATING A PIPELINED COLOR PROCESSING DEVICE

[75] Inventor: Yoav Bresler, Tel Aviv, Israel

[73] Assignee: Scitex Corporation Ltd., Herzliya, Israel

[21] Appl. No.: 766,765

[22] Filed: Sep. 27, 1991

Related U.S. Application Data

[62] Division of Ser. No. 650,461, Feb. 4, 1991.

[30] Foreign Application Priority Data

| | | | |
|---|---|---|---|
| Feb. 5, 1990 | [IL] | Israel | 93274 |
| Feb. 22, 1990 | [IL] | Israel | 93493 |
| Dec. 27, 1990 | [IL] | Israel | 96816 |
| Dec. 30, 1990 | [IL] | Israel | 96829 |
| Jan. 15, 1991 | [IL] | Israel | 96955 |
| Jan. 15, 1991 | [IL] | Israel | 96957 |

[51] Int. Cl.[5] .......... H04N 1/46

[52] U.S. Cl. .......... 358/406; 358/500; 358/527

[58] Field of Search .......... 358/406, 75, 80; 395/131; 382/17; H04N 1/46

[56] References Cited

U.S. PATENT DOCUMENTS

| | | | |
|---|---|---|---|
| 4,282,510 | 4/1981 | Southgate | 250/572 |
| 4,334,240 | 6/1982 | Franklin | 358/78 |
| 4,347,580 | 8/1982 | Bond | 364/824 |
| 4,350,996 | 9/1982 | Rosenfeld | 358/75 |
| 4,456,924 | 6/1984 | Rosenfeld | 358/75 |
| 4,472,786 | 9/1984 | Larson | 364/822 |
| 4,477,833 | 10/1984 | Clark | 358/80 |
| 4,481,532 | 11/1984 | Clark et al. | 358/406 |
| 4,500,919 | 2/1985 | Schreiber | 358/80 |
| 4,511,989 | 4/1985 | Sakamoto | 364/723 |
| 4,639,770 | 1/1987 | Jung | 358/76 |
| 4,712,141 | 12/1987 | Tomohisa | 358/80 |
| 4,717,954 | 1/1988 | Fujita | 358/80 |

(List continued on next page.)

OTHER PUBLICATIONS

Gonzalez et al, "Digital Image Processing", Addison-Wesley, 1987.

R. W. G. Hunt, "The Reproduction of Color in Photography, Printing and Television", Fountain Press, England, 1987.

J. J. Sara, "The Automated Reproduction of Pictures . . . ", thesis at MIT, MA, USA, Aug., 1984.

Park et al, "Image Reconstruction by Parametric Cubic Conversion", Computer Vision, Graphics & Image Processing 23, 1983, pp. 258-272.

A. W. Paeath, "Algorithms for Fast Color Correction", Proc. of the SID, vol. 30/3, 1989.

Lamming et al, "Video to Print-an Empirical Approach", Proc. of the SID, vol. 30/3, 1989.

(List continued on next page.)

*Primary Examiner*—Edward L. Coles, Sr.
*Assistant Examiner*—Jill Jackson
*Attorney, Agent, or Firm*—Ladas & Parry

[57] ABSTRACT

A method and apparatus for adapting a digital representation of a first color image for output representation by an output device having spatial and color characteristics are disclosed. The apparatus includes apparatus for modifying the spatial characteristics of the digital representation of the first color image and the color characteristics of the first color image to correspond to the spatial and color characteristics of the output device such that, in an output representation, the color characteristics of the first color image would be substantially preserved. The method includes the step of modifying the spatial characteristics of the digital representation of the first color image and the color characteristics of the first color image to correspond to the spatial and color characteristics of the output device such that, in an output representation, the color characteristics of the first color image would be substantially preserved.

5 Claims, 31 Drawing Sheets

U.S. PATENT DOCUMENTS

| | | | |
|---|---|---|---|
| 4,752,822 | 6/1988 | Kawamura | 358/80 |
| 4,779,106 | 10/1988 | Mills | 358/80 |
| 4,812,904 | 3/1989 | Maring et al. | 358/80 |
| 4,819,193 | 4/1989 | Imao | 358/80 |
| 4,825,386 | 4/1989 | Bogacki | 364/518 |
| 4,833,531 | 5/1989 | Abe | 358/77 |
| 4,837,722 | 6/1989 | Sara | 364/723 |
| 4,888,636 | 12/1989 | Abe | 358/80 |
| 5,081,529 | 1/1992 | Collette | 358/80 |

OTHER PUBLICATIONS

Stone et al, "Color Gamut & the Printing of Digital Images", ACM Trans. of Graphics, vol. 7, No. 34, Oct. 1988, pp. 249–292.

Schowengerdt et al, "Topics in the two Dimensional Sampling and Reconstruction of Images", Int. J. of Remote Sensing, 1984, vol. 5(2), pp. 333–347.

Hall, "Computer Image Processing . . . ", Academic Press, New York, 1979, pp. 390–413.

Baxes, "Digital Image Processing", Prentice-Hall, Englewood Cliffs, N.J., 1984, pp. 2, 48, 50, 144, 149–150, 160.

Hwang et al, "Computer Architecture and Parallel Processing", McGraw Hill, 1984.

Johnson, "The Application of Printing Specifications . . . ", TAGA Proc., 1988, p. 502.

Yule, "Principles of Color Reproduction", Jon Wiley & Sons, New York, 1967.

"Society of Motion Picture and Television Engineers, SMPTE Standard for Television . . . ", SMPTE 240M, 1988.

Nussbaumer, "Fast Fourier Transform and Convolution Algorithms", Springer-Verlag, Berlin, 1980.

| | PIPELINE SEGMENTS \ LX | 1 | 2 | 3 | 3 | 4 | 5 | 6 | 6 | 7 | 8 | 8 | 9 | 10 | 11 | 11 | 12 | 13 | 13 | 14 | 15 | 16 | 16 |
|---|---|---|---|---|---|---|---|---|---|---|---|---|---|---|---|---|---|---|---|---|---|---|---|
| | X | 2.5 | 1.5 | 0.5 | 3.0 | 2.0 | 1.0 | 0 | 2.5 | 1.5 | 0.5 | 3.0 | 2.0 | 1.0 | 0 | 2.5 | 1.5 | 0.5 | 3.0 | 2.0 | 1.0 | 0 | 2.5 |
| | MULTIPLIERS 218 | 1 | 2 | 3 | $R_0$ | 4 | 5 | 6 | $R_1$ | 7 | 8 | $R_2$ | 9 | 10 | 11 | $R_3$ | 12 | 13 | $R_4$ | 14 | 15 | 16 | $R_5$ |
| TREE ADDER 220 | SEGMENT 1 | | 1 | 2 | 3 | $R_0$ | 4 | 5 | 6 | $R_1$ | 7 | 8 | R2 | 9 | 10 | 11 | $R_3$ | 12 | 13 | $R_4$ | 14 | 15 | 16 |
| | SEGMENT 2 | | | 1 | 2 | 3 | $R_0$ | 4 | 5 | 6 | $R_1$ | 7 | 8 | $R_2$ | 9 | 10 | 11 | $R_3$ | 12 | 13 | $R_4$ | 14 | 15 |
| | SEGMENT 3 | | | | 1 | 2 | 3 | $R_0$ | 4 | 5 | 6 | $R_1$ | 7 | 8 | $R_2$ | 9 | 10 | 11 | $R_3$ | 12 | 13 | R4 | 14 |
| SHIFT REGISTER 190 | CELL 5 | | | | | 1 | 2 | 3 | 3 | 4 | 5 | 5 | 6 | 7 | 8 | 8 | 9 | 10 | 10 | 11 | 12 | 13 | 13 |
| | CELL 4 | | | | | 1 | 1 | 2 | 2 | 3 | 4 | 4 | 5 | 6 | 7 | 7 | 8 | 9 | 9 | 10 | 11 | 12 | 12 |
| | CELL 3 | | | | | 1 | 1 | 1 | 1 | 2 | 3 | 3 | 4 | 5 | 6 | 6 | 7 | 8 | 8 | 9 | 10 | 11 | 11 |
| | CELL 2 | | | | | | 1 | 1 | 1 | 1 | 2 | 2 | 3 | 4 | 5 | 5 | 6 | 7 | 7 | 8 | 9 | 10 | 10 |
| | CELL 1 | | | | | | | 1 | 1 | 1 | 1 | 1 | 2 | 3 | 4 | 4 | 5 | 6 | 6 | 7 | 8 | 9 | 9 |
| | CLOCK CYCLES | 1 | 2 | 3 | 4 | 5 | 6 | 7 | 8 | 9 | 10 | 11 | 12 | 13 | 14 | 15 | 16 | 17 | 18 | 19 | 20 | 21 | 22 |

FIRST CONVOLUTION RESULT (clock cycle 11)

SECOND CONVOLUTION RESULT (clock cycle 14)

FIG. 13

METHOD AND APPARATUS FOR CALIBRATING A PIPELINED COLOR PROCESSING DEVICE

This is a divisional of copending application Ser. No. 07/650,461 filed on Feb. 4, 1991.

FIELD OF THE INVENTION

The present invention relates to apparatus and techniques for data processing generally and more particularly to apparatus and techniques for color image processing.

BACKGROUND OF THE INVENTION

Tone and color reproduction control in high quality graphic arts reproduction is still far from a science. This is particularly evident when a given acceptable result, already realized using given reproduction apparatus, is sought to be realized using other apparatus or using the same apparatus but with a different type of setting, such as a GCR setting relative to a normal "key black" setting. In such cases, a high degree of expertise, combined with time, effort, expense and patience is required to calibrate the additional apparatus. The results are not always satisfactory.

Tone and color reproduction control is particularly difficult when various portions of the color image to be reproduced are stored in different formats. For example, the color image to be reproduced may comprise first types of regions in which the color and tone vary from pixel to pixel, second types of regions in which the color and tone generally vary only between subregions and not between individual pixels, and third types of regions in which text is to be represented. The text regions may or may not overlap regions of the first and second types. The preferred format for each type of region varies.

A preferred format for regions of the first type in which the color and tone vary continuously is pixel by pixel representation, such as "CT" (continuous tone) format, in which the color and tone parameters of each individual pixel are stored, in a predetermined order. The color and tone parameters are generally represented by a vector such as a three or four component vector defined in a color coordinate system such as the CMYK, RGB and XYZ coordinate systems. It is appreciated that the vector need not have three or four components but rather may have any other suitable number of components. At least three orderings of the color and tone parameters are used:

a. "Pixel interleaves": All of the components of the first pixel of the color image are stored, followed by all of the components of the second pixel, and so on;

b. "Line interleaves": The first components of each of the pixels along the first row of the color image are stored sequentially, followed by the second components of each of the pixels in the first row, followed similarly by the third and then, for a four dimensional pixel, the fourth components of each pixel in the first row. This sequence of values is followed by the corresponding sequence of values representing the four components of each pixel in the second row, and so on; and c. "Separation interleaves": The first components of each of the pixels making up the entire color image, rather than single rows thereof, are stored sequentially, followed by the second components of each of the pixels making up the entire color image, followed similarly by the remaining components.

One preferred format for regions of the second type in which the color and tone vary only between subregions is "LW" (line work) format, also known as "run length encoding" or "line art". In this format, sequences of identical pixels along a particular row of the color image are not stored one by one but rather as a single data element, the data element comprising a first field ("color index") indicating the tone and color characteristics of each of the identical pixels and a second field ("run length") indicating the number of identical pixels in the sequence. It is appreciated that if a row of p pixels comprises s sequences of identical pixels, the sum of the values of the s second fields is p.

Preferably, one field of each data element stores a code indication of the tone and color characteristics of the corresponding sequence of identical pixels, and the key to the code is stored separately, e.g. in a LUT. This allows compactness of storage, assuming that many of the sequences are identically colored.

LW storage format of an image may also comprise a "transparency field" for each data element which stores delineations of regions of the image which are intended to bear sub-images stored in non-LW (e.g. CT or text) formats, the representations of which are to be "read into" the delineated regions. These delineated regions are designated as "transparent", i.e., may be defined only by the "read-in" sub-image, or may alternatively be non-transparent, in which case, in the final color image, the "read-in" sub-image will appear superimposed upon the pixels of the region as defined by the LW representation. The percentage of transparency may, therefore be 0%, corresponding to absolute opaqueness of the run length encoded representation, in which case any pixel-by-pixel representation of the corresponding area is meaningless "garbage", or may be 100%. More generally, the transparency percentage may also assume any intermediate value between 0% and 100%.

Alternatively, the transparency field may not be provided and instead, the color index or first field provides an indication of transparency. In other words, the color index may indicate either a particular color of the LW pixel or the transparency of the LW pixel.

It is appreciated that, if the LW storage format does comprise delineations of regions of the image which are intended to bear non-LW sub-images, such as CT sub-images, then it is not necessary to provide a CT representation of the entirety of the image. The areas of the image for which no CT representation is defined are referred to as having "undefined" CT values. Typically, a CT representation is defined for an area which circumscribes the plurality of areas which are at least partially transparent. Therefore, the area for which a CT representation si defined may be partitioned into the plurality of at least partially transparent areas, which areas comprise valid CT pixels, and into the remaining areas, which are defined in the LW file to be non-transparent and therefore comprise "garbage" CT pixels.

Text may be stored in "character graphics" type format, in which each letter, number, etc. is assigned a code, or alternatively may be stored in pixel by pixel or run length encoded form. Other storage formats for color images include Postscript and vector formats.

The difficulty in achieving adequate tone and color reproduction control when various portions of the color image to be reproduced are stored in different formats has at least the following components:

a. The need to define a single storage format and to convert all portions of the stored color image to that format efficiently and with minimum distortion of the image. Typically, the single storage format is a pixel by pixel format;

b. The issue of how to optimally define tone and color parameters for the boundary regions between adjacent portions of the color image originally stored in different formats, and for the regions at the edges of the color image. Specifically, even a single pixel at the output resolution may represent a portion of the color image which was previously represented by a plurality of pixels in LW format and a plurality of pixels in CT format.

c. The problem of how to deal with the uneven speed at which a stream of run length encoded data typically arrives, due to the fact that the run lengths of sequential runs often vary considerably.

d. The question of how to integrate different portions of the color image with different resolutions. The different resolutions are not always an integer multiple of one another.

Other problems which arise in relation to color image processing in general and reproduction in particular are:

e. Most color printing devices cannot "wait" for input but rather must be continuously fed with input. State of the art technology generally requires a large buffer to store a large reserve of input for the color printing device, but this solution is relatively inefficient.

f. Representations of a color image tend to differ as a function of the color printing device employed, including the inks or colorants employed thereby, the color reading device employed and the substrate employed to bear the color image (paper, CRT, etc.)

g. A number of color coordinate systems are in standard use for representing color values (RGB, CMYK, XYZ, etc.)

State of the art color image processing apparatus and techniques are described in the following documents, the disclosures of which are incorporated herein by reference:

"Digital Image Processing" by R. C. Gonzalez & P. Wintz, Addison-Wesley, 1987.

"The Reproduction of Color in Photography, Printing and Television" by R. W. G. Hunt, Fountain Press, England, 1987

"The Automated Reproduction of Pictures with Non-reproducible Colors" by Jason J. Sara, PhD. thesis at Massachusetts Institute of Technology, MA, USA, August, 1984, describes uses of multidimensional LUTs for color conversion and discusses interpolation methods.

"Image Reconstruction by Parametric Cubic Conversion" by Stephen K. Part and Robert A. Schowendert, Computer Vision, Graphics & Image Processing 23, 1983 pgs. 258–272 describes one dimensional convolution and its uses for image reconstruction.

"Algorithms for Fast Color Correction" by Alan W. Paeth, Proceedings of the SID, Vol. 30/3, 1989, describes the use of multidimensional LUTs for color manipulation (RGB to CMY only) and tri-linear interpolation.

"Video to Print—an Empirical Approach" by Michael G. Lamming & Warren Rhodes, Proceedings of the SID, Vol. 30/3, 1989, describes the use of 1D-LUTs and matrixes for color correction for RGB to CMY only.

"Color Gamut & the Printing of Digital Images" by Maureen C. Stone et al, ACM Transactions of Graphics, Vol. 7 No. 34, October, 1988, pg. 249–292, describes an attempt to reproduce digital images designed on a variety of different color monitors in a journal, using digital offset printing. The reproduction system described is calibrated using CIE tristimulus values. An image is represented as a set of three-dimensional points and a color output device is represented as a three-dimensional solid surrounding the set of all reproducible colors for that device. Since the sets of reproducible colors for monitors and printers are very different, a method for transforming image points to fit into the set of reproducible colors of the destination output device is described.

U.S. Pat. No. 4,282,510 to Southgate describes apparatus for discerning the noticeable presence of spatial fluctuations of intensity within a 2D visual field, comprising spatial convolvers and shift registers.

U.S. Pat. No. 4,334,240 to Franklin et al describes a primary color pyramid print interpolator which includes correction circuitry for the 3 primary colors and for black, for feeding into a computer and a memory.

U.S. Pat. No. 4,347,580 to Bond describes a spatial to array convolver or correlator.

U.S. Pat. No. 4,472,786 to Larson describes a spatial analog Gaussian convolver.

U.S. Pat. No. 4,477,833 to Clark et al describes a color conversion method including an interpolation step and interpolation and 3D-4D simplex color linear interpolation.

U.S. Pat. No. 4,481,5312 to Clark et al describes a method for determining and storing color printing information, and for generating 3 gray mapper curves using correction percentages for six colors including black.

U.S. Pat. No. 4,500,919 to Schreiber describes a color reproduction system which passes RGB values through a multidimensional LUT and interpolates to obtain a CMYK value.

U.S. Pat. No. 4,511,989 to Sakamoto describes 4D simplex color linear interpolation using a 16 bit addressed LUT.

U.S. Pat. No. 4,639,770 to Jung et al describes a method and apparatus for simulating a multi-colored reproduction on an color monitor.

U.S. Pat. No. 4,712,141 to Tomohisa et al describes a method and apparatus for interpolating image signals.

U.S. Pat. No. 4,717,954 to Fujita et al describes a method which uses a conversion table based on preprinted color charts for to determined half-tone dot percentages required to reproduce the color of a color specimen.

U.S. Pat. No. 4,752,822 to Kawamura describes color half-tone image processing apparatus for providing screen angles and having an adaptive color image data conversion LUT and a small capacity masking memory. The system processes both color and 'screen' using a 3D-LUT which is constructed in conjunction with a scanner.

U.S. Pat. No. 4,819,193 to Imao describes a gradation processing method for color images.

U.S. Pat. No. 4,825,386 to Bogacki describes a horizontal line processor of data which is processed sequentially.

U.S. Pat. No. 4,833,531 to Abe et al describes a technique for interpolating a color image for color image enlargement or reduction based on LUTs stored in memory.

U.S. Pat. No. 4,837,722 to Sara describes a digital, high speed 3D interpolation method, and hardware for tri-linear interpolation.

SUMMARY OF THE INVENTION

The present invention seeks to provide improved apparatus for tone and color reproduction control in graphic arts for publishing, military, medical, geographical and other applications. A sample application is when a proofer is used as a tool for simulating a printed representation of a color image which will subsequently be provided.

The present invention also seeks to provide improved convolution methods and improved hardware implementations of convolution algorithms. It is appreciated that the applicability of the convolution methods and apparatus disclosed herein is not limited to color image processing applications but rather has a very broad spectrum of applications including all applications in which it is desired to modify an element of a representation as a function of the neighboring elements within the representation. Sample applications, data compression, data encription, radar, ultrasound, image processing pattern extraction, control systems and signal filtering.

The present specification and claims refer to the data to be convolved as an image; however, it is appreciated that the data to be convolved may lack some of the characteristics of an image.

There is thus provided in accordance with a preferred embodiment of the present invention color processing apparatus for transforming at least a portion of a representation of at least a portion of a color image into an output digital representation thereof, the output representation being characterized in that, when printed on a predetermined color printing device, at least some aspects of the resulting analog representation of the color image generally resemble at least some aspects of a predetermined target representation of at least a portion of the color image, at least a portion of a representation to be transformed including a plurality of sub-representations differing in at least one of the following ways: representation format and spatial characteristics, the color processing apparatus including apparatus for receiving at least a portion of a representation of at least a portion of the color image, apparatus for modifying at least one of the following two aspects of at least one of the plurality of sub-representations: representation format and spatial characteristics, and apparatus for modifying the color characteristics of at least a portion of the color image to be transformed.

Further in accordance with a preferred embodiment of the present invention, the input representation of the color image includes a colorant value representation thereof.

Still further in accordance with a preferred embodiment of the present invention, the input representation of the color image includes at least a black component and at least one transformation is operated upon the input representation of the color image, one of the at least one transformations including a multiplicative function of the black component.

Additionally in accordance with a preferred embodiment of the present invention, the color processing apparatus also includes image portion selecting apparatus for selecting the portion of the color image whose representation is sought to be transformed.

Additionally in accordance with a preferred embodiment of the present invention, the color processing apparatus also includes representation portion selecting apparatus for selecting the portion of the input representation of the color image to be transformed.

Further in accordance with a preferred embodiment of the present invention, the input representation of the color image includes a plurality of representations of individual color components of the color image and the portion of the representation of the color image to be transformed includes at least some individual ones of the plurality of representations of individual color components.

According to yet a further embodiment of the present invention there is provided uniformizing apparatus for uniformizing the format of a representation of a color image, the representation including a plurality of representations of at least portions of the color image, wherein there exist first and second representations from among the plurality of representations, characterized in that the representation format of the first representation is non-identical to the representation format of the second representation, the uniformizing apparatus including apparatus for changing the representation format of at least one of the plurality of representations.

Further in accordance with a preferred embodiment of the present invention, at least some of the plurality of representations are stored in a representation format defining two levels of representation, such as transparent and opaque.

Still further in accordance with a preferred embodiment of the present invention, at least some of the plurality of representations are stored in a region-by-region encoded format.

Additionally in accordance with a preferred embodiment of the present invention, at least some of the plurality of representations are stored in a representation format defining at least three levels of representation.

Further in accordance with a preferred embodiment of the present invention, at least some of the plurality of representations are stored in a continuous-tone type format.

In accordance with still a further preferred embodiment of the present invention, there is provided apparatus for transforming an individual data element of a plurality of data elements as a function of at least two of the plurality of data elements, thereby to modify characteristics of the data defined by at least some of the plurality of data elements, the apparatus including convolving apparatus.

Further in accordance with an alternative embodiment of the present invention, the convolving apparatus includes a dual buffer.

There is also provided in accordance with a further alternative embodiment of the present invention image processing apparatus for receiving a color image including a first representation of a portion of the color image in a first high resolution, a second representation of a portion of the color image in a second low resolution and producing an output analog representation of a color image in a third intermediate resolution, the apparatus including apparatus for reducing the resolution of the first representation to the second lowest resolution, thereby defining lost data regarding the first representation, apparatus for storing the lost data regarding the first representation, apparatus for combining the first representation and the second representation, thereby to define a combined representation and apparatus for increasing the resolution of the combined representation to the third intermediate resolution of the output apparatus, the apparatus for increasing including apparatus for receiving the lost data regarding the first representation and employing the lost data to increase the resolution of the portion of the combined representation derived from the first representation.

Further in accordance with a preferred embodiment of the present invention, the convolving apparatus includes a serial input - parallel output shift register.

There is also provided in accordance with a further preferred embodiment of the present invention merging apparatus for merging first and second color image representations having different formats into a single color image representation with a generally uniform format, the apparatus including apparatus for combining the first and second color image representations.

Further in accordance with a preferred embodiment of the present invention, the first representation includes a pixel-by-pixel encoded representation.

Still further in accordance with a preferred embodiment of the present invention, the second representation includes a region-by-region encoded representation, each such region including a plurality of pixels.

Additionally in accordance with a preferred embodiment of the present invention, the single image representation includes a pixel-by-pixel encoded representation.

Still further in accordance with a preferred embodiment of the present invention, the resolution of the first representation is less than the resolution of the second representation.

Additionally in accordance with a preferred embodiment of the present invention, the first and second representations overlap, thereby defining an overlap area, for each location of the overlap area there is defined a proportion according to which the first and second representations are combined in the overlap area, and the apparatus for combining includes apparatus for combining the first and second representations in the overlap area in accordance with the proportion.

There is also provided in accordance with a preferred embodiment of the present invention bypass apparatus defining an algorithm dependent process latency including a bypass FIFO. characterized in that the bypass FIFO substantially eliminates the need to synchronize to the algorithm dependent process latency.

There is also provided in accordance with yet another preferred embodiment of the present invention image processing apparatus for processing an image, at least a portion of which is represented in accordance with a first representation format and at least a portion of which is represented in accordance with a second representation format, the image processing apparatus including at least one and preferably at least two of the following: color processing apparatus for transforming color characteristics of at least a portion of the prepresentation of the color image, spatial processing apparatus for transforming spatial characteristics of at least a portion of the representation of the color image, and screen processing apparatus.

There is further provided in accordance with a preferred embodiment of the present invention data processing apparatus including apparatus for sequentially providing data for a plurality of operations defining operation processing times, characterized in that the operation of the apparatus for sequentially providing data is generally independent of the relative lengths of the operation processing times.

Further in accordance with a preferred embodiment of the present invention, the apparatus for sequentially providing include a bypass FIFO.

There is further provided in accordance with still another preferred embodiment of the present invention image processing apparatus for processing a color image represented by a color image representation defined in space, the apparatus including apparatus for transforming only a portion of the representation corresponding to only a portion of the space to which the entire representation corresponds.

There is also provided in accordance with a further preferred embodiment of the present invention image processing apparatus for processing a color image represented by a color image representation, the representation including a plurality of subrepresentations, each representing a color component of the color image, the apparatus including apparatus for transforming only some of the plurality of subrepresentations.

There is further provided in accordance with yet a further preferred embodiment of the present invention data processing apparatus including apparatus for cyclically providing data, the apparatus for cyclically providing data including a multiplexer.

Further in accordance with a preferred embodiment of the present invention, the apparatus for combining includes a first combiner for combining the first and second representations in accordance with a first combining method, a second combiner for combining the first and second representations in accordance with a second combining method, and selecting apparatus for selecting the output of the first combiner or of the second combiner.

Still further in accordance with a preferred embodiment of the present invention, the first combiner includes convolving apparatus and the selecting apparatus includes apparatus for determining whether a convolution operation performed by the convolving apparatus is valid.

Still further in accordance with a preferred embodiment of the present invention, the apparatus for combining includes convolving apparatus, determining apparatus for determining whether a convolution operation performed by the convolving apparatus is valid, and apparatus for storing the output of the determining apparatus for a plurality of convolution operations.

Further in accordance with a preferred embodiment of the present invention, the apparatus for combining also includes averaging apparatus and the stored output of the apparatus for determining is used as input to the averaging operation performed by the averaging apparatus.

Still further in accordance with a preferred embodiment of the present invention, the combining apparatus are characterized in that all but the periphery of the portion of the color image representation corresponding to the first color image representation is generally uncontaminated by information from the second color image representation.

There is also provided in accordance with yet another preferred embodiment of the present invention merging apparatus for merging at least one color subrepresentations of first and second color image representations having different formats into a single color image representation with a generally uniform format, the first and second color image representations including a plurality of subrepresentations corresponding to a plurality of color components, the apparatus including apparatus for combining the first and second color image subrepresentations.

Further in accordance with a preferred embodiment of the present invention, the first representation format includes a page description language format such as Postscript format.

Still further in accordance with an alternative embodiment of the present invention, the representations of the image is at least three dimensional.

There is also provided in accordance with yet a further preferred embodiment of the present invention data processing apparatus including apparatus for rearranging an input stream of rows of data, thereby to obtain data suitable for matrix-type processing, the apparatus for rearranging including a video RAM.

Still further in accordance with a preferred embodiment of the present invention, the region by region encoded format includes a line work type format.

There is further provided in accordance with a further preferred embodiment of the present invention resolution varying apparatus for varying the resolution of a representation of a color image, the apparatus including apparatus for changing the resolution of an input representation of a color image.

Further in accordance with a preferred embodiment of the present invention, the combining apparatus are characterized in that the portion of the color image representation corresponding to the first color image representation is generally uncontaminated by information from the second color image representation.

There is also provided in accordance with a preferred embodiment of the invention a method for adapting a digital representation of a first color image for output representation by an output device, the output device having spatial and color characteristics, and including the step of modifying the spatial characteristics of the digital representation of the first color image and the color characteristics of the first color image, thereby to correspond to the spatial and color characteristics of the output device and such that, in an output representation, the color characteristics of the first color image would be substantially preserved.

There is further provided in accordance with a preferred embodiment of the present invention apparatus for adapting a digital representation of a first color image for output representation by an output device, the output device having spatial and color characteristics, and including apparatus for modifying the spatial characteristics of the digital representation of the first color image and the color characteristics of the first color image, thereby to correspond to the spatial and color characteristics of the output device and such that, in an output representation, the color characteristics of the first color image would be substantially preserved.

There is further provided in accordance with a preferred embodiment of the invention color processing apparatus including apparatus for receiving a first digital representation of a color image derived from a first analog representation of the color image, and apparatus for modifying the first digital representation while taking into account at least one characteristic of a color output device, thereby to provide a second digital representation of the color image, the second digital representation of the color image being characterized in that the appearance of a second analog representation provided by providing an output indication of the second digital representation on the color output device will substantially resemble a reference analog representation of the color image.

Further in accordance with a preferred embodiment of the present invention the color image includes a colored object and the analog representation of the color image is provided directly from a colored object.

Further in accordance with a preferred embodiment of the present invention the color image includes a colored object and the analog representation is provided from a reproduction of a colored object.

Further in accordance with a preferred embodiment of the present invention the first digital representation includes a plurality of digital subrepresentations respectively representing a corresponding plurality of portions of the color image.

Further in accordance with a preferred embodiment of the present invention the reference analog representation includes the first analog representation of the color image.

Further in accordance with a preferred embodiment of the present invention the color image includes gradations of a single color.

Additionally in accordance with a preferred embodiment of the present invention the color image includes a black and white image.

There is further provided in accordance with a preferred embodiment of the present invention a color processing method including the steps of receiving a first digital representation of a color image derived from a first analog representation of the color image and modifying the first digital representation while taking into account at least one characteristic of a color output device, thereby to provide a second digital representation of the color image, the second digital representation of the color image being characterized in that the appearance of a second analog representation provided by providing an output indication of the second digital representation on the color output device will substantially resemble the first analog representation of the color image.

Further in accordance with a preferred embodiment of the present invention the representation of the color image includes a plurality of differently formatted subrepresentations of subimages.

There is further provided in accordance with a preferred embodiment of the present invention a method for representing a portion of a color image as an output pixel, the portion of the color image including a plurality of locations encoded according to a plurality of formats and defining a corresponding plurality of color component values, the method including the step of computing an output color component value which is related to each of the plurality of color component values.

Additionally in accordance with a preferred embodiment of the present invention the output color component value is related to each of the areas of each of the plurality of locations.

Additionally in accordance with a preferred embodiment of the present invention the output color component value is a weighted sum of the plurality of color component values, the weight of each individual one of the plurality of color component values being related to the area of the location corresponding to the individual color component value.

Further in accordance with a preferred embodiment of the present invention the weight of each individual one of the plurality of color component values is proportional to the area of the location corresponding to the individual color component value.

Further in accordance with a preferred embodiment of the present invention at least some of the plurality of locations are pixel by pixel encoded.

Further in accordance with a preferred embodiment of the present invention at least some of the plurality of locations are region by region encoded.

There is further provided in accordance with a preferred embodiment of the present invention a method for representing a subportion of a color image as an output pixel, the subportion of the color image being contained within a portion of the color image including a plurality of locations defining a corresponding plurality of color component values, the method including the steps of defining at least some of the plurality of color component values as relevant, and computing an output color component value which is related to each of the relevant color component values.

Additionally in accordance with a preferred embodiment of the present invention the subportion of the color image and the portion of the color image are of equal area.

Additionally in accordance with a preferred embodiment of the present invention the area of the subportion of the color image is less than the area of the portion of the color image.

Further in accordance with a preferred embodiment of the present inventions the output color component value is related to the distances of each of the locations corresponding to relevant color component values from the center of the subportion.

Additionally in accordance with a preferred embodiment of the present invention the step of defining includes the step of assigning a level of relevance to each of the plurality of color component values.

Additionally in accordance with a preferred embodiment of the present invention the step of assigning includes the step of selecting, for each of the plurality of color component values, a level of relevance from among at least three levels of relevance.

There is further provided in accordance with a preferred embodiment of the present invention a method for representing a subportion of a color image as an output pixel, the subportion of the color image being contained within a portion of the color image including a first plurality of locations encoded in a first format and defining a corresponding first plurality of color component values, and a second plurality of locations encoded in a second format and defining a corresponding second plurality of color component values, the method including the steps of partitioning the second plurality of locations into a third plurality of locations, encoding the third plurality of locations in the first format, thereby to define a third plurality of color component values, and computing an output color component value which is related to the first and third pluralities of color component values.

There is further provided in accordance with a preferred embodiment of the present invention a method for representing a subportion of a color image as an output pixel, the subportion of the color image being contained within a portion of the color image including at least one of a first plurality of locations encoded in a first format and defining a corresponding first plurality of color component values, and a second plurality of locations encoded in a second format and defining a corresponding second plurality of color component values, the method including the steps of providing, if the portion of the color image includes no locations encoded in the second format, an output color component value which is related to each of the first plurality of color component values, and providing, if the portion of the color image includes locations encoded in the second format, an output color component value which is related only to the individual ones from among the first and second pluralities of color component values which are contained within the subportion.

There is further provided in accordance with a preferred embodiment of the invention a method for representing a color image in memory and including the steps of representing a first portion of the color image at a first resolution, thereby to define a first plurality of first color component values, representing a second portion of the color image, at least partially overlapping the first portion of the color image, thereby to define an overlapping subportion, at a second resolution lower than the first resolution, thereby to define a second plurality of second color component values, computing data indicating the transparency of the first color component values corresponding to the overlapping subportion to the second color component values corresponding to the overlapping subportion, and storing the data in operative association with at least some of the second plurality of color component values.

Further in accordance with a preferred embodiment of the present invention the method also includes the step of representing the first portion to define a first plurality of first color component vectors, each vector including at least two first color component values and the step of representing the second portion to define a second plurality of second color component vectors, each vector including at least two second color component vectors, and the step of computing is performed only once for the at least two second color component values.

Further in accordance with a preferred embodiment of the present invention the data includes a single bit of information.

Additionally in accordance with a preferred embodiment of the present invention the bit of information is determined in accordance with a user selectable rule.

Additionally in accordance with a preferred embodiment of the present invention the step of representing the second portion includes the step of reading the second portion, and the step of storing is carried out on the fly during the step of reading the second portion.

Further in accordance with a preferred embodiment of the present invention the second color component values define a matrix of second color component values having rows and columns and the method also includes the step of computing data indicating the transparencies of the first color component values to an individual one of the rows and the columns of the second color component values.

Additionally in accordance with a preferred embodiment of the present invention the method also includes the step of using data indicating the transparencies of the first color component values to an individual one of the rows and the columns of the second color component values to compute the transparency of the matrix.

Further in accordance with a preferred embodiment of the present invention the method also includes the step of using the stored data to compute the proportion of transparency of at least one first color component value to a plurality of second color component values.

Further in accordance with a preferred embodiment of the present invention the step of computing includes the step of convolving the first and third pluralities of color component values with a coefficient matrix.

There is further provided in accordance with a preferred embodiment of the present invention a method for representing a portion of a color image as an output pixel, the portion of the color image including a plurality of locations defining a corresponding plurality of color component values, the method including the step of computing a plurality of output color component values each related to at least some of the plurality of color component values, and selecting one of the plurality of output color component values as a color component value of the output pixel.

There is further provided in accordance with a preferred embodiment of the present invention a method for representing a subportion of a color image as an output pixel, the subportion of the color image being contained within a portion of the color image including a plurality of locations arranged as a grid defining a corresponding array of color component values, the method including the steps of providing a first plurality of first coefficients corresponding in number to a first plurality of positions along a first dimension of the array, providing a second plurality of second coefficients corresponding in number to a second plurality of positions along a second dimension of the array, providing, for each position along the second dimension of the array, a weighted color component value sum including a weighted sum of the color component values along the first dimension at the position along the second dimension, each color component value along the first dimension being weighted by the first coefficient corresponding to the position of the color component value along the first dimension, and computing a weighted sum of a plurality of the weighted color component value sums, each weighted color component value sum being weighted by the second coefficient corresponding to the position of the weighted color component value sum along the second dimension.

There is further provided in accordance with a preferred embodiment of the invention a method for representing a subportion of an image as an output element, the subportion of the image being contained within a portion of the image including a plurality of locations arranged as a grid defining a corresponding array of values, the method including the steps of providing a first plurality of first coefficients corresponding in number to a first plurality of positions along a first dimension of the array, providing a second plurality of second coefficients corresponding in number to a second plurality of positions along a second dimension of the array, providing, for each position along the second dimension of the array, a weighted value sum including a weighted sum of the values along the first dimension at the position along the second dimension, each value along the first dimension being weighted by the first coefficient corresponding to the position of the value along the first dimension, and computing a weighted sum of a plurality of the weighted value sums, each weighted value sum being weighted by the second coefficient corresponding to the position of the weighted value sum along the second dimension, the step of providing along the second dimension including the step of providing computing apparatus for computing at least one of the weighted value sums and for subsequently computing the weighted sum of the weighted value sums.

Further in accordance with a preferred embodiment of the present invention the step of computing a weighted sum is initiated after a multiplicity of weighted color component value sums have been provided and before any additional weighted color component value sums have been provided, the multiplicity of weighted color component value sums being at least equal in number to the plurality of weighted color component value sums.

Additionally in accordance with a preferred embodiment of the present invention the multiplicity of weighted color component value sums is equal in number to the plurality of weighted color component value sums.

Additionally in accordance with a preferred embodiment of the present invention the multiplicity of weighted color component value sums exceeds the plurality of weighted color component value sums in number by at least one.

Further in accordance with a preferred embodiment of the present invention the step of computing a weighted sum is completed while at least one additional weighted color component value sum is being provided.

Further in accordance with a preferred embodiment of the present invention the image is represented at an input resolution and the output element defines an output resolution, such that the input resolution is nonequal in value to the output resolution.

There is further provided in accordance with a preferred embodiment of the present invention a method for representing a subportion of an image as an output element, the subportion of the image being contained within a portion of the image including a plurality of locations arranged as a grid defining a corresponding array of values, the method including the steps of providing a first plurality of first coefficients corresponding in number to a first plurality of positions along a first dimension of the array, providing a second plurality of second coefficients corresponding in number to a second plurality of positions along a second dimension of the array, providing, for each position along the second dimension of the array, a weighted value sum including a weighted sum of the values along the first dimension at the position along the second dimension, each value along the first dimension being weighted by the first coefficient corresponding to the position of the value along the first dimension, and computing a weighted sum of a plurality of the weighted value sums along the first dimension, each weighted value sum along the first dimension being weighted by the first coefficient corresponding to the position of the weighted value sum along the first dimension, the step of providing for each position including the step of operating at least one first computing apparatus for computing weighted value sums and the step of computing including the step of operating at least one second computing apparatus for computing weighted sums of pluralities of weighted value sums.

Additionally in accordance with a preferred embodiment of the present invention the ratio between the number of operating first computing apparatus and the number of operating second computing apparatus corresponds to the ratio between an input resolution and a desired output resolution.

Further in accordance with a preferred embodiment of the present invention the ratio between the number of operating first computing apparatus and the number of operating second computing apparatus corresponds to the ratio between an input resolution of the first dimension and a desired output resolution of the first dimension.

Additionally in accordance with a preferred embodiment of the present invention the image includes a color image and each output element includes a pixel.

Additionally in accordance with a preferred embodiment of the present invention the image includes a color image and each output element includes a pixel.

Further in accordance with a preferred embodiment of the present invention the step of providing for each position along the first dimension includes the step of discarding at least one weighted color component value sum.

Further in accordance with a preferred embodiment of the present invention the step of providing for each position along the first dimension includes the step of retaining at least one weighted color component value sum computed in order to represent a previous output pixel.

There is further provided in accordance with a preferred embodiment of the present invention a method for representing a subportion of a color image as an output pixel, the subportion of the color image being contained within a portion of the color image including a plurality of locations arranged as a grid defining a corresponding array of color component values, the method including the steps of providing a first plurality of first coefficients corresponding in number to a first plurality of positions along a first dimension of the array, providing a second plurality of second coefficients corresponding in number to a second plurality of positions along a second dimension of the array, providing a third plurality of third coefficients corresponding in number to a third plurality of positions along a third dimension of the array, providing, for each ordered pair of positions along the second and third dimensions of the array, a weighted color component value sum including a weighted sum of the color component values along the first dimension at the ordered pair of positions, each color component value along the first dimension at the ordered pair of positions being weighted by the first coefficient corresponding to the position of the color component value along the first dimension, computing, for each position along the third dimension of the array, a weighted sum of the weighted color component value sums along the second dimension at the position along the third dimension, each weighted color component value sum along the second dimension at the position along the third dimension being weighted by the second coefficient corresponding to the position of the weighted color component value sum along the second dimension, and computing a weighted sum of the weighted sums of the weighted color component value sums along the third dimension, each weighted sum of the weighted color component value sums along the third dimension being weighted by the third coefficient corresponding to the position of the weighted sum of weighted color component value sums along the third dimension.

Further in accordance with a preferred embodiment of the present invention the method also includes the step of providing computing apparatus for computing at least one of the weighted color component value sums and for subsequently computing the weighted sum of the weighted color component value sums.

Additionally in accordance with a preferred embodiment of the present invention the step of computing a weighted sum is initiated after a multiplicity of weighted color component value sums have been provided and before additional weighted color component value sums have been provided, the multiplicity of weighted color component value sums being at least equal in number to the number of weighted color component value sums.

Further in accordance with a preferred embodiment of the present invention the step of providing for each ordered pair of positions includes the step of operating at least one first computing apparatus for computing weighted color component value sums and the step of computing includes the step of operating at least one second computing apparatus for computing weighted sums of weighted color component value sums.

Additionally in accordance with a preferred embodiment of the present invention the ratio between the number of operating first computing apparatus and the number of operating second computing apparatus corresponds to the ratio between an input resolution and a desired output resolution.

Further in accordance with a preferred embodiment of the present invention the ratio between the number of operating first computing apparatus and the number of operating a second computing apparatus corresponds to the ratio between an input resolution of the first dimension and a desired output resolution of the first dimension.

Additionally in accordance with a preferred embodiment of the present invention the method also includes the step of providing computing apparatus for computing at least one of the weighted sums of weighted color component value sums and for subsequently computing the weighted sum of weighted sums of the weighted color component value sums.

Additionally in accordance with a preferred embodiment of the present invention the step of computing a weighted sum of weighted sums is initiated after a multiplicity of weighted sums of weighted color component value sums have been provided and before additional weighted sums of weighted color component value sums have been provided, the multiplicity of weighted sums of weighted color component value sums being at least equal in number to the number of weighted sums of weighted color component value sums.

Additionally in accordance with a preferred embodiment of the present invention the step of providing for each ordered pair of positions includes the step of operating at least one first computing apparatus for computing weighted sums of weighted color component value sums and the step of computing includes the step of operating at least one second computing apparatus for computing weighted sums of weighted sums of weighted color component value sums.

Further in accordance with a preferred embodiment of the present invention the ratio between the number of operating first computing apparatus and the number of operating second computing apparatus corresponds to the ratio between an input resolution of the first dimension and a desired output resolution of the first dimension.

There is further provided in accordance with a preferred embodiment of the present invention a method for representing a subportion of a color image as an output pixel, the subportion of the color image being contained within a portion of the color image including a plurality of locations arranged as a grid defining a corresponding n dimensional array of color component values, where n is a natural number, the method including the steps of providing n respective pluralities of coefficients respectively corresponding in number to n pluralities of positions along the respective n dimensions of the array, performing, for each individual one, k, of the first n−1 dimensions, the step of providing, for each position along the (k+1)th dimension of the array, a weighted color component value sum including a weighted sum of color component value parameters along the kth dimension at the position along the (k+1)th dimension, each color component parameter along the kth dimension being weighted by the kth coefficient corresponding to the position of the color component value parameter along the kth dimension, and computing a weighted sum of the weighted color component value parameters along the nth dimension, each weighted color component value parameter along the nth dimension being weighted by the nth coefficient corresponding to the position of the weighted color component value parameter along the nth dimension.

There is further provided in accordance with a preferred embodiment of the present invention a method for representing a subportion of a color image as an output pixel, the subportion of the color image being contained within a portion of the color image including a plurality of locations arranged as a grid defining a corresponding n dimensional array of color component values, where n is a natural number, the method including the steps of providing n respective pluralities of coefficients respectively corresponding in number to n pluralities of positions along the respective n dimensions of the array, performing, for each individual one, k, of the first n−1 dimensions, the step of providing, for each position within an array defined by the dimensions k+1 to n, a weighted color component value sum including a weighted sum of color component value parameters along the kth dimension at the position within the array defined by the dimensions k+1 to n, each color component value parameter along the kth dimension being weighted by the kth coefficient corresponding to the position of the color component value parameter along the kth dimension, and computing a weighted sum of the weighted color component value sums along the nth dimension, each weighted color component value parameter along the nth dimension being weighted by the nth coefficient corresponding to the position of the weighted color component value parameter along the nth dimension.

Further in accordance with a preferred embodiment of the present invention each pixel is represented by a plurality of color component values.

Additionally in accordance with a preferred embodiment of the present invention the image is represented at an input resolution and the output element defines an output resolution, such that the input resolution is nonequal in value to the output resolution.

Additionally in accordance with a preferred embodiment of the present invention the method also includes the step of providing computing apparatus for computing at least one of the weighted color component value sums and for subsequently computing the weighted sum of the weighted color component value sums.

Additionally in accordance with a preferred embodiment of the present invention the step of computing a weighted sum is initiated after a multiplicity of weighted color component value sums have been provided and before additional weighted color component value sums have been provided, the multiplicity of weighted color component value sums being at least equal in number to the plurality of weighted color component value sums.

There is further provided in accordance with a preferred embodiment of the present invention apparatus for directing an ordered plurality of data elements into an ordered plurality of channels in accordance with a selected correspondence between the plurality of data elements and the plurality of channels and including apparatus for receiving input indicative of the selected correspondence, and apparatus for directing into each individual one of the plurality of channels the data element corresponding to the individual one of the plurality of channels, the selected correspondence between the plurality of data elements and the plurality of channels including the correspondence whereby each individual data element from among the ordered plurality of data elements is paired with a corresponding channel from among a new ordering of the plurality of channels, the new ordering of the plurality of channels being defined by a selected one from among the set of cyclic permutations of the plurality of channels as originally ordered.

Further in accordance with a preferred embodiment of the present invention the ordered plurality of data elements is normally provided by a corresponding ordered plurality of sources and the apparatus for directing is operative to direct an individual data element provided by a selected one of the pluralities of sources to at least two of the plurality of channels if at least one of the remaining ones of the plurality of sources does not contain data.

Further in accordance with a preferred embodiment of the present invention each data element represents a position along a first dimension of a color image and includes a multiplicity of data units, each data unit representing a position along the second dimension of the color image.

Further in accordance with a preferred embodiment of the present invention the apparatus for directing is operative to direct an individual data element provided by an individual one of the plurality of sources representing an edge position along the first dimension to at least two of the plurality of channels if at least one of the remaining ones of the plurality of sources does not contain data.

There is further provided in accordance with a preferred embodiment of the present invention data storage apparatus for storing data having at least two dimensions, the data defining a sequence of rows, the sequence of rows defining, for each row, a position integer determining the position of the row within the sequence, the apparatus including a predetermined number of storage apparatus, each individual one of the storage apparatus being operative to store a subsequence from among the sequence of rows, the difference between the position integers of adjacent rows in the subsequence being equal to the predetermined number.

Additionally in accordance with a preferred embodiment of the present invention each storage apparatus includes at least one video RAM.

Further in accordance with a preferred embodiment of the present invention the apparatus also includes directing apparatus for directing individual rows into individual ones from among a plurality of channels, the number of the plurality of channels preferably being equal to the predetermined number.

Further in accordance with a preferred embodiment of the present invention the number of the plurality of channels is equal to the predetermined number.

Additionally in accordance with a preferred embodiment of the present invention the directing apparatus includes apparatus for channeling individual rows from the predetermined number of storage apparatus into individual ones from among the predetermined number of channels in accordance with a selected correspondence between the storage apparatus and the channels, the apparatus for channeling including apparatus for receiving input indicative of the selected correspondence, and apparatus for directing into each individual one of the plurality of channels the row corresponding to the individual one of the plurality of channels, the selected correspondence between the plurality of data elements and the plurality of channels including a selected one from among a set of cyclic permutations of the predetermined number of storage apparatus.

There is further provided in accordance with a preferred embodiment of the present invention color processing apparatus including transforming apparatus for transforming first multidimensional color data covering substantially the entirety of an input color domain of the transforming apparatus into second multidimensional color data, and modifying apparatus for modifying a plurality of multidimensional color data elements, thereby to provide first multidimensional color data covering substantially the entirety of the input color domain of the transforming apparatus.

Further in accordance with a preferred embodiment of the present invention the first and second multidimensional color data are both represented in the same color space.

Additionally in accordance with a preferred embodiment of the present invention the first and second multidimensional color data are represented in different color spaces.

There is further provided in accordance with a preferred embodiment of the present invention color processing apparatus including transforming apparatus for transforming first multidimensional color data into second multidimensional color data, the transforming apparatus including a multidimensional table defining a plurality of table dimensions, and wherein $2^n+1$ points being provided along at least one of the plurality of table dimensions, where n is the number of MSB's used for computing a portion of the address which defines a position along a dimension of the multidimensional table.

Additionally in accordance with a preferred embodiment of the present invention the transforming apparatus includes multidimensional transforming apparatus for transforming a first multidimensional color data element, the first multidimensional color data element including a first vector having a first plurality of components, into a second multidimensional data element, the second multidimensional data element including a second vector having a second plurality of components, each component of the second vector being a selected one from among a first set of results of transformations defined from a set of first vectors.

Additionally in accordance with a preferred embodiment of the present invention the modifying apparatus includes at least one modifying device disposed serially with respect to the multidimensional transforming apparatus for transforming a third multidimensional color data element, the third multidimensional color data element including a third vector having a third plurality of components, into a fourth multidimensional data element, the fourth multidimensional data element including a fourth vector having a fourth plurality of components, each component of the fourth vector being a selected one from among a subset of the first set of transformations.

Further in accordance with a preferred embodiment of the present invention the subset of the first set of vector to scalar transformations includes the set of vector to scalar linear transformations.

Further in accordance with a preferred embodiment of the present invention the subset of the first set of vector to scalar transformations includes a set of transformations from some of the first components.

There is further provided in accordance with a preferred embodiment of the present invention color processing apparatus including transforming apparatus for transforming first multidimensional color data defining a plurality of dimensions into second multidimensional color data, the transforming apparatus including a plurality of multiplying apparatus corresponding in number to the plurality of dimensions, thereby to allow all dimensions of the first multidimensional color data to be processed in parallel.

Further in accordance with a preferred embodiment of the present invention the apparatus also includes, downstream of an individual one of the at least one modifying devices, apparatus for selecting from among the third multidimensional data element received by the individual one of the at least one modifying devices and the fourth multidimensional data element output therefrom.

Additionally in accordance with a preferred embodiment of the present invention the third and fourth pluralities of components correspond in number, the apparatus also including, downstream of an individual one of the at least one modifying devices, apparatus for selecting from among an individual component of the third multidimensional data element received by the individual one of the at least one modifying devices and the corresponding component of the fourth multidimensional data element output therefrom.

There is further provided in accordance with a preferred embodiment of the present invention apparatus for comparing each individual one of a stream of incoming data elements to a corresponding individual one of a stream of outcoming data elements corresponding in number to the stream of incoming data elements, the stream of outcoming data elements being generated by performing at least one sequential operation on each individual one of the stream of incoming data elements, the apparatus including apparatus for receiving an individual one of the stream of outcoming data elements and apparatus for retrieving the incoming data element corresponding to the individual outcoming data element and including apparatus for storing and accessing the stream of incoming data elements, wherein any individual incoming data element may only be accessed after all previous individual incoming data elements have been accessed.

Additionally in accordance with a preferred embodiment of the present invention at least one of the at least one sequential operations includes the operation of delaying an incoming data element.

Additionally in accordance with a preferred embodiment of the present invention the apparatus for storing and accessing includes a FIFO.

Further in accordance with a preferred embodiment of the present invention each data element includes a color value defining at least one color component scalar.

Additionally in accordance with a preferred embodiment of the present invention the at least one sequential operations includes a plurality of operations.

There is further provided in accordance with a preferred embodiment of the present invention color processing apparatus for processing multidimensional color data, each individual multidimensional data element having a plurality of components, the apparatus including apparatus for computing a nonlinear combination of at least some of the plurality of components of an individual multidimensional data element.

Additionally in accordance with a preferred embodiment of the present invention the plurality of components includes a masking component which masks out the remaining components.

Further in accordance with a preferred embodiment of the present invention the apparatus for computing includes apparatus for computing a multiplicative function of the masking component.

Additionally in accordance with a preferred embodiment of the present invention the multiplicative function includes a multiple of the masking component and of a linear combination of at least one of the remaining components.

There is also provided in accordance with a preferred embodiment of the present invention a color processing method including the steps of receiving a first digital representation of a color image derived from a first analog representation of the color image and modifying the first digital representation while taking into account at least one characteristic of a color output device, thereby providing a second digital representation of the color image, the second digital representation of the color image being characterized in that the appearance of a second analog representation provided by providing an output indication of the second digital representation on the color output device will substantially resemble a reference analog representation of the color image.

There is also provided in accordance with a preferred embodiment of the present invention color processing apparatus including apparatus for receiving a first digital representation of a color image derived from a first analog representation of the color image and apparatus for modifying the first digital representation while taking into account at least one characteristic of a color output device, thereby providing a second digital representation of the color image, the second digital representation of the color image being characterized in that the appearance of a second analog representation provided by providing an output indication of the second digital representation on the color output device will substantially resemble the first analog representation of the color image.

There is also provided in accordance with a preferred embodiment of the present invention apparatus for representing a portion of a color image as an output pixel, the portion of the color image including a plurality of locations encoded according to a plurality of formats and defining a corresponding plurality of color component values, the apparatus including apparatus for computing an output color component value which is related to each of the plurality of color component values.

There is also provided in accordance with a preferred embodiment of the present invention apparatus for representing a subportion of a color image as an output pixel, the subportion of the color image being contained within a portion of the color image including a plurality of locations defining a corresponding plurality of color component values, the apparatus including apparatus for defining at least some of the plurality of color component values as relevant, and apparatus for computing an output color component value which is related to each of the relevant color component values.

There is also provided in accordance with a preferred embodiment of the present invention apparatus for representing a subportion of a color image as an output pixel, the subportion of the color image being contained within a portion of the color image including a first plurality of locations encoded in a first format and defining a corresponding first plurality of color component values, and a second plurality of locations encoded in a second format and defining a corresponding second plurality of color component values, the apparatus including apparatus for partitioning the second plurality of locations into a third plurality of locations, apparatus for encoding the third plurality of locations in the first format, thereby defining a third plurality of color component values, and apparatus for computing an output color component value which is related to the first and third pluralities of color component values.

There is also provided in accordance with a preferred embodiment of the present invention apparatus for representing a subportion of a color image as an output pixel, the subportion of the color image being contained within a portion of the color image including at least one of a first plurality of locations encoded in a first format and defining a corresponding first plurality of color component values, and a second plurality of locations encoded in a second format and defining a corresponding second plurality of color component values, the apparatus including apparatus for providing an output color component value which is related to each of the first plurality of color component values if the portion of the color image includes no locations encoded in the second format, and apparatus for providing an output color component value which is related only to the individual ones from among the first and second pluralities of color component values which are contained within the subportion fi the portion of the color image includes locations encoded in the second format.

There is also provided in accordance with a preferred embodiment of the present invention apparatus for representing a color image in memory and including apparatus for representing a first portion of the color image at a first resolution, thereby defining a first plurality of first color component values, apparatus for representing a second portion of the color image, at least partially overlapping the first portion of the color image, thereby defining an overlapping subportion, at a second resolution lower than the first resolution, thereby defining a second plurality of second color component values, apparatus for computing data indicating the transparency of the first color component values corresponding to the overlapping subportion o the second color component values corresponding to the overlapping subportion, and apparatus for storing the data in operative association with at least some of the second plurality of color component values.

There is also provided in accordance with a preferred embodiment of the present invention apparatus for representing a portion of a color image as an output pixel, the portion of the color image including a plurality of locations defining a corresponding plurality of color component values, the apparatus including apparatus for computing a plurality of output color component values each related to at least some of the plurality of color component values, and apparatus for selecting one of the plurality of output color component values as a color component value of the output pixel.

There is also provided in accordance with a preferred embodiment of the present invention apparatus for representing a subportion of a color image as an output pixel, the subportion of the color image being contained within a portion of the color image including a plurality of locations arranges as a grid defining a corresponding array of color component values, the apparatus including apparatus for providing a first plurality of first coefficients corresponding in number to a first plurality of positions along a first dimension of the array, apparatus for providing a second plurality of second coefficients corresponding in number to a second plurality of positions along a second dimension of the array, apparatus for providing, for each position along the second dimension of the array, a weighted color component value sum including a weighted sum of the color component values along the first dimension at the position along the second dimension, each color component value along the first dimension being weighted by the first coefficient corresponding to the position of the color component value along the first dimension, and apparatus for computing a weighted sum of a plurality of the weighted color component value sums, each weighted color component value sum being weighted by the second coefficient corresponding to the position of the weighted color component value sum along the second dimension.

There is also provided in accordance with a preferred embodiment of the present invention apparatus for representing a subportion of an image as an output element, the subportion of the image being contained within a portion of the image including a plurality of locations arranged as a grid defining a corresponding array of values, the apparatus including apparatus for providing a first plurality of first coefficients corresponding in number to a first plurality of positions along a first dimension of the array, apparatus for providing a second plurality of second coefficients corresponding in number to a second plurality of positions along a second dimension of the array, apparatus for providing, for each position along the second dimension of the array, a weighted value sum including a weighted sum of the values along the first dimension at the position along the second dimension, each value along the first dimension being weighted by the first coefficient corresponding to the position of the value along the first dimension, and apparatus for computing a weighted sum of a plurality of the weighted value sums, each weighted value sum being weighted by the second coefficient corresponding to the position of the weighted value sum along the second dimension, the apparatus for providing along the second dimension including computing apparatus for computing at least one of the weighted value sums and for subsequently computing the weighted sum of the weighted value sums.

There is also provided in accordance with a preferred embodiment of the present invention apparatus for representing a subportion of an image as an output element, the subportion of the image being contained within a portion of the image including a plurality of locations arranged as a grid defining a corresponding array of values, the apparatus including apparatus for providing a first plurality of first coefficients corresponding in number to a first plurality of positions along a first dimension of the array, apparatus for providing a second plurality of second coefficients corresponding in number to a second plurality of positions along a second dimension of the array, apparatus for providing, for each position along the second dimension of the array, a weighted value sum including a weighted sum of the values along the first dimension at the position along the second dimension, each value along the first dimension being weighted by the first coefficient corresponding to the position of the value along the first dimension, and apparatus for computing a weighted sum of a plurality of the weighted value sums along the first dimension, each weighted value sum along the first dimension being weighted by the first coefficient corresponding to the position of the weighted value sum along the first dimension, the apparatus for providing for each position including at least one first computing apparatus for computing weighted value sums and the apparatus for computing including at least one second computing apparatus for computing weighted sums of pluralities of weighted value sums.

There is also provided in accordance with a preferred embodiment of the present invention apparatus for representing a subportion of a color image as an output pixel, the subportion of the color image being contained within a portion of the color image including a plurality of locations arranged as a grid defining a corresponding array of color component values, the apparatus including apparatus for providing a first plurality of first coefficients corresponding in number to a first plurality of positions along a first dimension of the array, apparatus for providing a second plurality of second coefficients corresponding in number to a second plurality of positions along a second dimension of the array, apparatus for providing a third plurality of third coefficients corresponding in number to a third plurality of positions along a third dimension of the array, apparatus for providing, for each ordered pair of positions along the second and third dimensions of the array, a weighted color component value sum including a weighted sum of the color component values along the first dimension at the ordered pair of positions, each color component value along the first dimension at the ordered pair of positions being weighted by the first coefficient corresponding to the position of the color component value along the first dimension, apparatus for computing, for each position along the third dimension of the array, a weighted sum of the weighted color component value sums along the second dimension at the position along the third dimension, each weighted color component value sum along the second dimension at the position along the third dimension being weighted by the second coefficient corresponding to the position of the weighted color component value sum along the second dimension, and apparatus for computing a weighted sum of the weighted sums of the weighted color component value sums along the third dimension, each weighted sum of the weighted color component value sums along the third dimension being weighted by the third coefficient corresponding to the position of the weighted sum of weighted color component value sums along the third dimension.

There is also provided in accordance with a preferred embodiment of the present invention apparatus for representing a subportion of a color image as an output pixel, the subportion of the color image being contained within a portion of the color image including a plurality of locations arranged as a grid defining a corresponding n dimensional array of color component values, where n is a natural number, the apparatus including apparatus for providing n respective pluralities of coefficients respectively corresponding in number to n pluralities of positions along the respective n dimensions of the array, apparatus for performing, for each individual one, k, of the first n−1 dimensions, the step of providing, for each position along the (k+1)th dimension of the array, a weighted color component value sum including a weighted sum of color component value parameters along the kth dimension at the position along the (k+1)th dimension, each color component parameter along the kth dimension being weighted by the kth coefficient corresponding to the position of the color component value parameter along the kth dimension, and apparatus for computing a weighted sum of the weighted color component value parameters along the nth dimension, each weighted color component value parameter along the nth dimension being weighted by the nth coefficient corresponding to the position of the weighted color component value parameter along the nth dimension.

There is also provided in accordance with a preferred embodiment of the present invention apparatus for representing a subportion of a color image as an output pixel, the subportion of the color image being contained within a portion of the color image including a plurality of locations arranged as a grid defining a corresponding n dimensional array of color component values, where n is a natural number, the apparatus including apparatus for providing n respective pluralities of coefficients respectively corresponding in number ton pluralities of positions along the respective n dimensions of the array, apparatus for performing, for each individual one, k, of the first n−1 dimensions, the step of providing, for each position within an array defined by the dimensions k+1 to n, a weighted color component value sum including a weighted sum of color component value parameters along the kth dimension at the position within the array defined by the dimensions k+1 to n, each color component value parameter along the kth dimension being weighted by the kth coefficient corresponding to the position of the color component value parameter along the kth dimension, and apparatus for computing a weighted sum of the weighted color component value sums along the nth dimension, each weighted color component value parameter along the nth dimension being weighted by the nth coefficient corresponding to the position of the weighted color component value parameter along the nth dimension.

There is also provided in accordance with a preferred embodiment of the present invention a method for directing an ordered plurality of data elements into an ordered plurality of channels in accordance with a selected correspondence between the plurality of data elements and the plurality of channels, the method including the steps of receiving input indicative of the selected correspondence, and directing into each individual one of the plurality of channels the data element corresponding to the individual one of the plurality of channels, the selected correspondence between the plurality of data elements and the plurality of channels including the correspondence whereby each individual data element from among the ordered plurality of data elements is paired with a corresponding channel from among a new ordering of the plurality of channels the new ordering of the plurality of channels being defined by a selected one from among the set of cyclic permutations of the plurality of channels as originally ordered.

There is also provided in accordance with a preferred embodiment of the present invention a data storage method for storing data having at least two dimensions, the data defining a sequence of rows, the sequence of rows defining, for each row, a position integer determining the position of the row within the sequence, the method including the steps of providing a predetermined number of storage apparatus, each individual one of the storage apparatus being operative to store a subsequence from among the sequence of rows, the difference between the position integers of adjacent rows in the subsequence being equal to the predetermined number.

There is also provided in accordance with a preferred embodiment of the present invention a color processing method including the steps of providing transforming apparatus for transforming first multidimensional color data covering substantially the entirety of an input color domain of the transforming apparatus into second multidimensional color data, and modifying a plurality of multidimensional color data elements, thereby providing first multidimensional color data covering substantially the entirety of the input color domain of the transforming apparatus.

There is also provided in accordance with a preferred embodiment of the present invention a color processing method including the steps of transforming first multidimensional color data defining a plurality of dimensions into second multidimensional color data, the transforming step including the step of providing a plurality of multiplying apparatus corresponding in number to the plurality of dimensions, thereby allowing all dimensions of the first multidimensional color data to be processed in parallel.

There is also provided in accordance with a preferred embodiment of the present invention a method for comparing each individual one of a stream of incoming data elements to a corresponding individual one of a stream of outcoming data elements corresponding in number to the stream of incoming data elements, the stream of outcoming data elements being generated by performing at least one sequential operation on each individual one of the stream of incoming data elements, the method including the steps of receiving an individual one of the stream of outcoming data elements and retrieving the incoming data element corresponding to the individual outcoming data element, the step of retrieving including the step of storing and accessing the stream of incoming data elements where any individual incoming data element may only be accessed after all previous individual incoming data elements have been accessed.

There is also provided in accordance with a preferred embodiment of the present invention a color processing method for processing multidimensional color data, each individual multidimensional data element having a plurality of components, the method including the step of computing a nonlinear combination of at least some of the plurality of components of an individual multidimensional data element.

There is also provided in accordance with a preferred embodiment of the present invention a method for calibrating a first color processing device, the first color processing device including a pipeline, the pipeline defining at least one initial color processing unit and a final color processing unit, the method including the steps of providing a first representation of the reference color image, processing a second representation of the reference color image using the final color processing unit, thereby defining a third representation of the reference color image, and comparing the first and third representations and calibrating at least one of the at least one initial color processing units in accordance with the comparison.

In accordance with a preferred embodiment of the present invention the at least one initial color processing unit includes a plurality of initial color processing units and the method also includes, following the comparing step, the step of repeating at least once the steps of processing the second representation of the reference color image using the at least one calibrated initial color processing unit and the final color processing unit, thereby defining a fourth representation of the reference color image, and comparing the first and fourth representations and calibrating at least one of the at least one uncalibrated initial color processing units in accordance with the comparison.

There is also provided according to the present invention apparatus for calibrating a first color processing device, the first color processing device including a pipeline, the pipeline defining at least one initial color processing unit and a final color processing unit, the apparatus including apparatus for providing a first representation of the reference color image, apparatus for processing a second representation of the reference color image using the final color processing unit, thereby defining a third representation of the reference color image, and apparatus for comparing the first and third representations and calibrating at least one of the at least one initial color processing units in accordance with the comparison.

Further in accordance with a preferred embodiment of the invention the at least one processing unit calibrated in the comparing step includes the color processing unit immediately preceding the final color processing unit in the pipeline.

Additionally in accordance with a preferred embodiment of the invention the step of providing includes the step of processing the second representation of the reference color image using a second color processing device.

Further in accordance with a preferred embodiment of the invention the apparatus for computing a non linear combination includes apparatus for reducing the dimension of the multidimensional color data.

Additionally in accordance with a preferred embodiment of the invention the masking component includes a black component.

There is also provided in accordance with a preferred embodiment of the present invention convolving apparatus for convolving d dimensional data elements, where d is at least 3, the convolving apparatus including apparatus for providing at least one plurality of coefficients corresponding in number to a plurality of positions along at least one dimension from among the d dimensions and convolving apparatus for performing convolution on the d dimensional data elements and including apparatus for performing one dimensional convolution on at least one of the at least one dimensions.

Further in accordance with a preferred embodiment of the present invention, the at least one dimension includes a plurality of dimensions and the apparatus for performing are operative to perform one dimensional convolution on at least two from among the plurality of dimensions.

Still further in accordance with a preferred embodiment of the present invention, the apparatus for performing one dimensional convolution includes multiplying apparatus and adding apparatus.

Additionally in accordance with a preferred embodiment of the present invention, each data element is s dimensional.

Still further in accordance with a preferred embodiment of the present invention, the convolving apparatus defines an output density of the convolved data provided thereby and the d dimensional data is provided at an input density and the input density is not equal to the output density.

Further in accordance with a preferred embodiment of the present invention, the convolving apparatus includes storage apparatus for storing at least one partial result.

Additionally in accordance with a preferred embodiment of the present invention, the at least one partial result includes a partial result corresponding to a first subset of the set of d dimensions, the first subset defining a second subset which is complementary thereto, and the convolving apparatus also includes apparatus for retrieving and reusing the partial result.

Further in accordance with a preferred embodiment of the present invention, the apparatus for retrieving and reusing includes apparatus for retrieving and reusing the at least one partial result when performing convolution on a third subset of the set of d dimensions, the third subset being a subset of the second subset.

There is also provided a data transformation method for performing a first separable and symmetric transformation defining a first data domain, wherein performing the first transformation is mathematically equivalent to the following steps;

at least twice, performing a second transformation defined from respective multiplicities of members of the data domain, thereby to define a transformed data domain, and performing a third transformation from a multiplicity of members of the transformed data domain, thereby to define a further transformed data domain, the third transformation being functionally equal to the second transformation, the method including the steps of providing storage apparatus, performing the second transformation on at least one multiplicity of members of the data domain, thereby to define at least one transformed member of the data domain, storing at least one transformed member of the data domain in the storage apparatus, and using the at least one stored transformed member in order to perform the third transformation on at least two multiplicities of members of the transformed data domain, each of the at least two multiplicities of members of the transformed data domain including the at least one stored transformed member.

Further in accordance with a preferred embodiment of the present invention, the step of using the at least one stored transformed member reduces the number of data operations necessary in order to perform the third transformation on the at least two multiplicities of members of the first range.

Still further in accordance with a preferred embodiment of the present invention, the first transformation includes an individual one of the following group:

a maximum function, a minimum function, and a linear function.

Additionally in accordance with a preferred embodiment of the present invention, the steps of performing, storing and using are performed on a body of data and the step of using the at least one stored transformed member reduces the number of data operations necessary in order to perform the first transformation on the body of data.

Further in accordance with a preferred embodiment of the present invention, at least two of the multiplicity of members of the transformed data domain are equal.

In accordance with a preferred embodiment of the present invention, there is provided a data transformation method for performing a desired transformation defining a first data domain, wherein performing the desired transformation is mathematically equivalent to the following steps:

performing a first transformation defined from respective multiplicities of members of the data domain, thereby to define a range of the first transformation, and performing the following step for each transformation k, from among a set of t transformations, where t is at least one and k is an index (k=2, . . . , t+1), each of the t transformations being functionally equal to one another and to the first transformation, the kth transformation for each k from 2 to t+1 being defined from the range of the (k−1)th third transformation, the first third transformation being defined from the range of the second transformation:

performing the kth transformation from a multiplicity of embers of the range of the (k−1)th transformation, thereby to define at least one member of the range of the kth transformation, the method including the steps of providing storage apparatus, performing the first transformation on at least one multiplicity of members of the data domain, thereby to define at least one transformed member of the data domain, performing the kth transformation, for each transformation k from among the set of t transformations, from a multiplicity of members of the range of the (k−1)th transformation, thereby to define at least one member of the range of the kth transformation, the step of performing for each transformation k including the step of storing at least one member of the range of at least one of the transformations 1, . . . , t−1 in the storage apparatus, and using the at least one stored member in order to perform at least one transformation k on at least two multiplicities of members of the range of the (k−1)th transformation.

Further in accordance with a preferred embodiment of the present invention, each member of the data domain is s-dimensional.

Still further in accordance with a preferred embodiment of the present invention, the step of storing normally includes the step of discarding a stored transformed member of the data domain for each transformed member of the data domain loaded in the storage apparatus.

Additionally in accordance with a preferred embodiment of the present invention, the at least two multiplicities includes at least first and second multiplicities and the step of using includes the step of performing the third transformation on at least the first multiplicity of members of the transformed data domain, subsequently performing the second transformation at least once, thereby to provide at least one member of at least the second multiplicity of members not including the at least one stored transformed member, and subsequently performing the third transformation on at least the second multiplicity of members of the transformed data domain.

Additionally in accordance with a preferred embodiment of the present invention, t is equal to 3.

There is also provided in accordance with a further preferred embodiment of the present invention, a convolution method for convolving d dimensional data elements, where d is at least 3, the method including the steps of providing at least one plurality of coefficients corresponding in number to a plurality of positions along at least one dimension from among the d dimensions, and performing convolution on the d dimensional data elements, the step of performing including performing one dimensional convolution on at least one of the at least one dimensions.

There is further provided in accordance with still a further preferred embodiment of the present invention transformation apparatus for performing a first separable and symmetric transformation defining a first data domain, wherein performing the first transformation is mathematically equivalent to the following steps:

at least twice, performing a second transformation defined from respective multiplicities of members of the data domain, thereby to define a transformed data domain, and performing a third transformation from a multiplicity of members of the transformed data domain, thereby to define a further transformed data domain, the third transformation being functionally equal to the second transformation, the apparatus including storage apparatus, apparatus for performing the second transformation on at least one multiplicity of members of the data domain, thereby to define at least one transformed member of the data domain, apparatus for storing at least one transformed member of the data domain in the storage apparatus, and apparatus for using the at least one stored transformed member in order to perform the third transformation on at least two multiplicities of members of the transformed data domain, each of the at least two multiplicities of members of the transformed data domain including the at least one stored transformed member.

There is also provided in accordance with a further preferred embodiment of the present invention data transformation apparatus for performing a desired transformation defining a first data domain, wherein performing the desired transformation is mathematically equivalent to the following steps:

performing a first transformation defined from respective multiplicities of members of the data domain, thereby to define a range of the first transformation, and performing the following step for each transformation k, from among a set of t transformations, where t is at least one and k is an index (k=2, . . . , t+1), each of the t transformations being functionally equal to one another and to the first transformation, the kth transformation for each k from 2 to t+1 being defined from the range of the (k−1)th third transformation, the first third transformation being defined from the image of the second transformation:

performing the kth transformation from a multiplicity of members of the range of the (k−1)th transformation, thereby to define at least one member of the range of the kth transformation, the apparatus including storage apparatus, apparatus for performing the first transformation on at least one multiplicity of members of the data domain, thereby to define at least one transformed member of the data domain, apparatus for performing, for each transformation k from among the set of t transformations, the kth transformation from a multiplicity of members of the range of the (k−1)th transformation, thereby to define at least one member of the range of the kth transformation, the apparatus for performing for each transformation k including apparatus for storing at least one member of the range of at least one of the transformations 1, . . . , t−1 in the storage apparatus, and apparatus for using the at least one stored member in order to perform at least one transformation k on at least two multiplicities of members of the range of the (k−1)th transformation.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
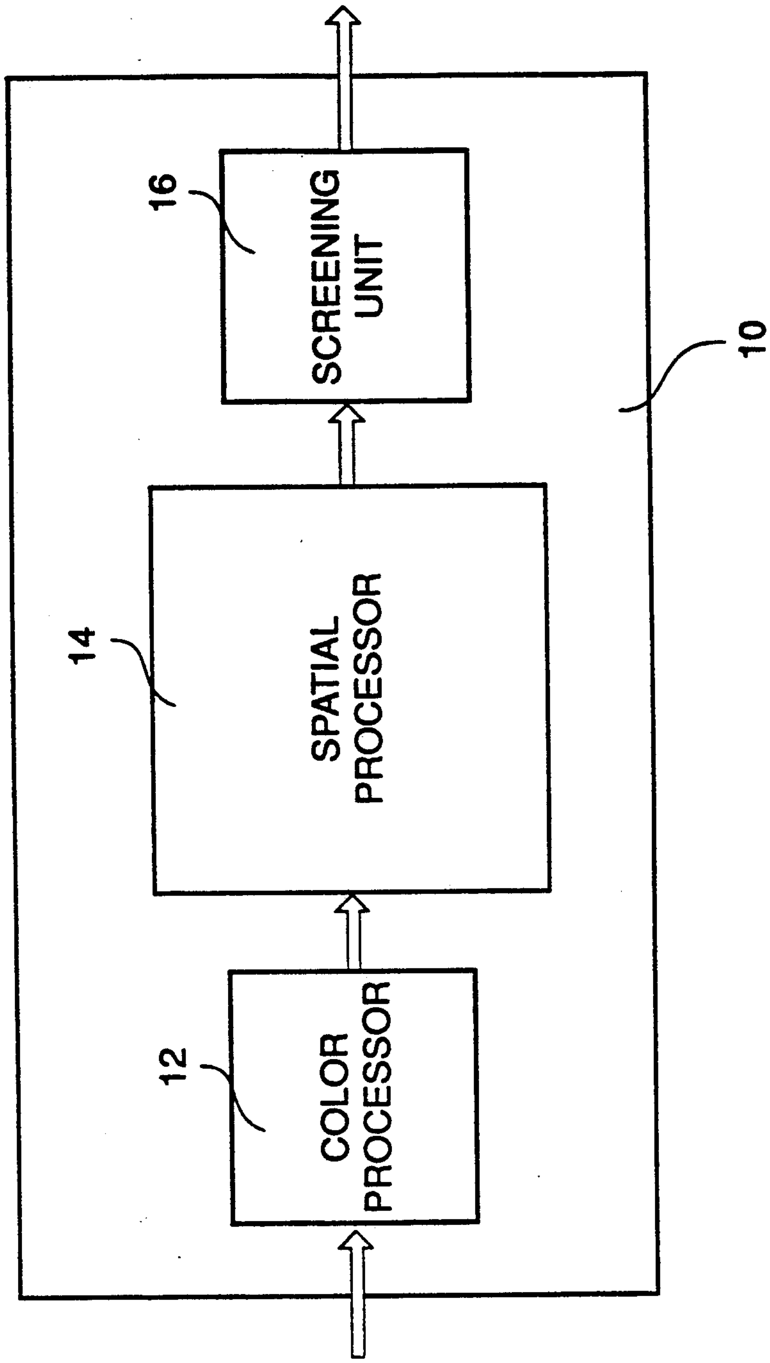
FIG. 1 is a generalized block diagram of image processing apparatus constructed and operative in accordance with a first alternative embodiment of the present invention.

The following terms, employed herein, are intended to have the meanings specified hereinbelow:

Color image: This term is intended to include images comprising gradations of a single color such as black and white images and gray images.

Color characteristics: The characteristics of the color image defined by individual elements of a representation of a color image which directly represent a color or a component of a color.

Spatial characteristics: Characteristics defining the arrangement of and the relationship between elements of a representation of a color image which do not directly represent a color or a component of a color, including but not limited to resolution and format characteristics such as pixel by pixel vs. region by region encoding, transparency characteristics, and the presence of additional bits of information such as the validity bit as described herein.

Resolution: The number of pixel lengths used to represent a unit of length of a color image. The resolution may or may not be the same along the X and Y axes of the color image.

Depth of color: The number of distinct values which each component of the vector representing the color of a pixel can assume. Typically, it is desired to ensure that each component can assume any of 256 distinct values, in which case each vector component is represented by 8 bits.

Screen processor: Apparatus which converts a substantially continuously defined pixel value, e.g. of 8 bit per separation depth, to a binary representation thereof. The binary representation typically comprises a single tone image, at least one of the characteristics of the image (size, shape, location on background, etc.) representing the continuous value.

Analog representation of a color image: A representation of a color image which is analogous or similar to the color image. An analog representation may appear upon a transparency, a photograph, a CRT display, a printed page, or any other suitable substrate.

Digital representation of a color image: Any representation of a color image which is expressed in discrete symbols, such as numerical symbols. A common digital representation of a color image is a digital file comprising a plurality of numerical values corresponding to a plurality of pixels into which the color image has ben divided, each such numerical value representing some aspect pertaining to the color appearance of the corresponding pixel.

Color reading apparatus/device: Apparatus which inputs an analog representation of a color image and converts it to a digital representation thereof, e.g. scanners, colorimeters, spectrum analyzers, densitometers. Typically, the digital representation is expressed in a coordinate system such s CMYK, CMY, RGB, XYZ, etc.

Color printing/output apparatus/device: Apparatus which inputs a digital representation of a color image and converts it into an analog representation thereof. For example: offset, gravure, or other printing apparatus employing inks, conventional or direct digital proofing machines, plotters or color recorders which expose photographic materials, electrostatic printing systems employing powder colorants, color monitors, and color CRT displays.

Subsampling: A method of assigning a pixel value to a portion of a color image previously represented by a plurality of pixel values, by selecting a location within the portion of the color image and assigning the pixel value of that particular location to the entire portion. It is also known in the art to select a plurality of locations, which must be stored in identical format, and assign the mean pixel value of these locations to the entire portion.

Averaging: A procedure for changing the resolution of an input representation of a color image. If the resolution is to be decreased, each relatively large output pixel is assigned a value computed by averaging the pixel values of at least some and preferably all of the relatively small input pixels representing the portion of the image corresponding to the output pixel. If the resolution is to be increased, each relatively small output pixel is assigned the value of the relatively large input pixel within which it falls. If the output pixel falls on the boundary between adjacent input pixels, it is assigned the mean pixel value of the adjacent input pixels.

Spatial Processing: Detecting and/or transforming the spatial characteristic of a representation of a color image which may pertain to at least the characteristics of the representation of the color image and/or to the mutual relationship between adjacent portions of the color image. For example: change of format (e.g. LW to CT), change of resolution, filtering including edge detection and processing, blur/sharp functions, etc., and combinations of these operations.

Substrate: Physical apparatus bearing or displaying an analog representation of an image, e.g. transparency, Cromalin (registered trademark), CRT display, photograph, paper product, surfaces suitable for painting on, etc.

Range or output gamut of color processing apparatus: The totality of color values which can be output by the color processing apparatus.

Domain or input gamut of color processing apparatus: The totality of color values which can be input by the color processing apparatus.

Color processing apparatus: Apparatus which inputs a first representation of a color image (digital or analog) and converts it into a second representation thereof (analog or digital), thereby to define a transformation from at least a portion of the range into the domain.

Calibration: Adjusting color processing apparatus in order to obtain representations, having predetermined substantially objective color characteristics, of color images sought to be processed.

Color value: A representation of a color, typically in a color coordinate system such as but not limited to RGB, $L^*a^*b^*$, XYZ coordinate systems and device dependent coordinate systems such as color head signals e.g. RGB, ink percentages e.g. CMYK, etc.

Colorant, ink, etc.: Any material which causes the human eye's light energy receptors to be stimulated including liquid colorants, powder colorants, photographic colorants, phosphors, etc.

Colorant values: A digital representation of the amount of a colorant which it is sought to use.

It is appreciated that any references to color, color images, color values, colorant values, etc. in the present specification are intended to include the instances of black and white as colors or color values, black and white images, black colorant and ink, etc.

The following abbreviations are used:

TCR: tone and color reproduction

GCR: gray component replacement

UCR: Undercolor removal

RGB: red, green, blue. More generally, the term as used herein may refer to any color signals produced by a color reading device. In a color separation scanner, the term normally refers to the color separation signals of the scanner prior to processing thereof.

CMYK: cyan, magenta, yellow, black (colorants such as inks). More generally, the term as used herein refers to any signals which may serve as input for a color printing device.

ECSS: electronic color separation scanner

DECSS: digital electronic color separation scanner

Alternative embodiments of the invention are now generally described with reference to FIGS. 1 to 40. A preferred embodiment of the invention will be described in detail below with reference to FIGS. 41–44.

Reference is now made to FIG. 1, which conceptually illustrates image processing apparatus 10 constructed and operative in accordance with a preferred embodiment of the present invention.

The image processing apparatus 10 of the present invention comprises at least one and preferably all three of the following:

a. A color processing unit 12 for processing color characteristics of an input color image;
b. A spatial processing unit 14 for processing spatial characteristics of the color image; and
c. A halftoning "screen" unit 16.

The screen unit is not required if the image processing apparatus of the present invention is connected to output apparatus with an integral screen device of its own or to a CT output device.

Preferably, the spatial processing unit 14 performs at least the following two functions. Preferably, the user may select use of both functions or use of only a single function:

a. A scaling function for varying the resolution of some or all portions of the representation of the image; and
b. A merging function for combining representations of portions of the image, which may be stored in different storage formats, into a single representation of the image. Merging or combining representations of portions of the image may comprise at least the following steps, not necessarily in this order:
   "opening" the run length encoded representation of the image, thereby to obtain pixel by pixel representations; and
   modifying the pixels in the vicinity of the boundary between representations of portions of the image.

The data may flow through the apparatus from left to right, in the above illustration. Alternatively, the data may flow through the spatial processing unit 14 prior to flowing through the color unit 12. Also, some or all components of the color unit 12 and the spatial processing unit 14, described in detail below, may not be provided, or alternatively may be provided but may be linked by a suitable bypass structure, thereby to enable them to be selectably bypassed, as described in detail below.

Appendices A and B, appended hereto, are software embodiments of the color processing means 14 and spatial processing means 12 of FIG. 1, constructed and operative in accordance with a preferred embodiment of the present invention. These computer listings are written in Intel's OMF 286 format and are operative on any commercially available system based on Intel's 386 CPU having an RMX operating system, such as a MicroWhisper workstation, commercially available from Scitex Corporation, Herzlia, Israel. These computer listings are understood most easily with reference to a coassigned Israel Patent Application of Applicants', a complete copy of which is appended hereto and is referenced Appendix C.

According to a preferred embodiment of the present invention, the image processing apparatus can accept page description language such as Post-Script. The Postscript input may arrive from a Scitex MicroWhisper-based workstation having been converted by suitable means such as the "PS-Bridge", commercially available from Scitex Corporation, Herzlia, Israel, into CT/LW format.

Figure 2:
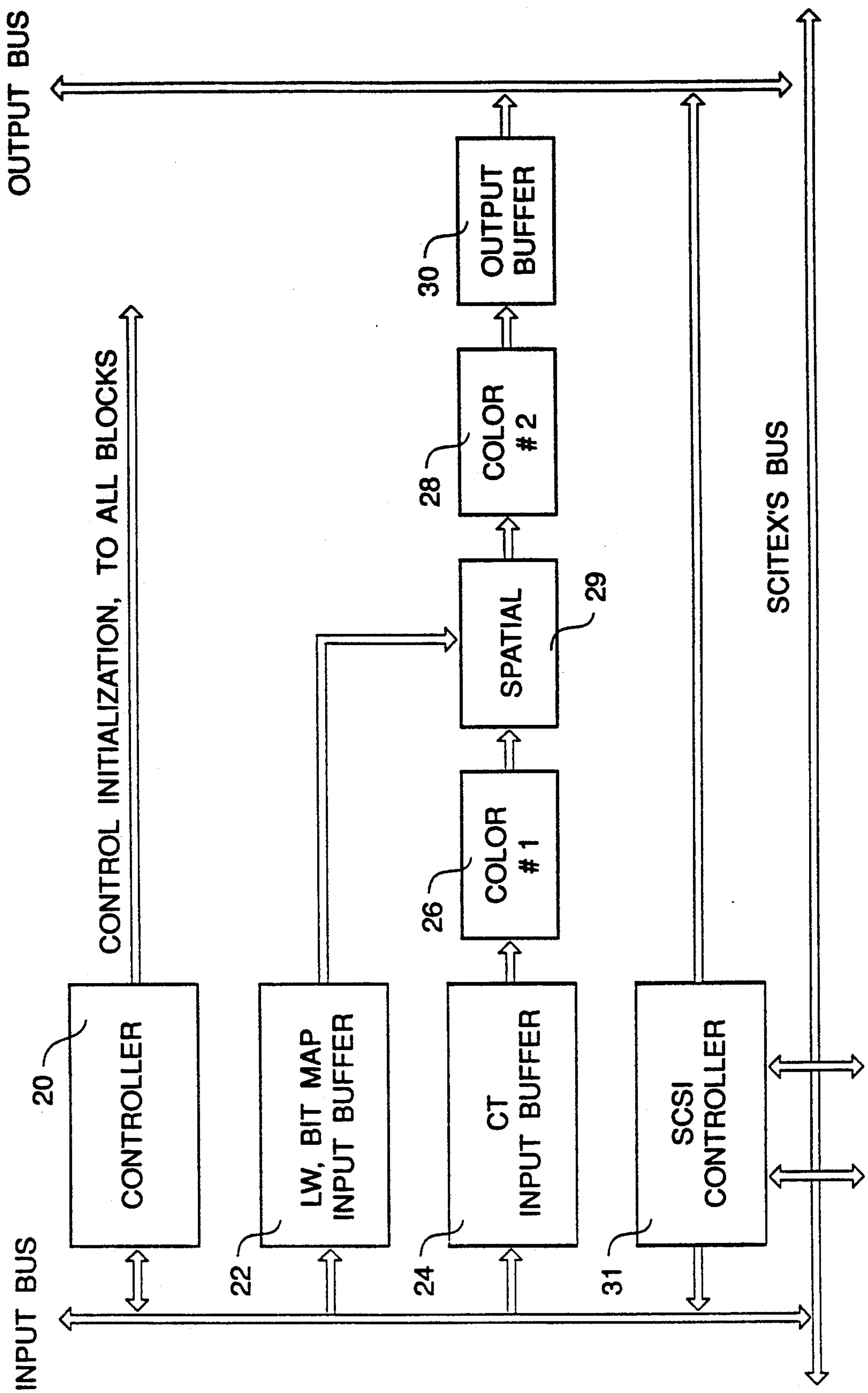
FIG. 2 is a generalized block diagram of a preferred hardware implementation of image processing apparatus constructed and operative in accordance with a second alternative embodiment of the present invention.

Reference is now made to FIG. 2 which illustrates a preferred hardware embodiment of image processing apparatus constructed and operative in accordance with a second alternative embodiment of the present invention. The apparatus of FIG. 2 comprises a controller 20, a LW/bitmap input buffer 22, a CT input buffer 24 and two color manipulation units 26 and 28 which each perform part of the color processing functions described hereinabove with reference to FIG. 29. The apparatus of FIG. 2 also comprises a spatial manipulation unit 29 which may be similar to spatial unit 14 of FIG. 1, an output buffer 30 and a SCSI controller 31.

Controller 20 controls all operations, data transfers, initializations, table loading, and protocol to the outside world or to other workstations. Controller 20 is typically an Intel 80386 based controller. For faster systems, a RISC chip, such as the R3000 by MIPS Corporation, USA, may be used.

Input buffer 22 is a video RAM buffer, similar to the buffer described with reference to FIG. 24, which stores sections of the LW and/or bitmap data for future reading by spatial manipulation unit 29. The data is stored in an order which facilitates fast retrieval for spatial manipulation unit 29. Input buffer 22 is of a size that matches the data formats and data transfer speeds and is typically a $0.2M \times 16$ bit buffer.

CT buffer 24 is a video RAM buffer, similar to the one described with reference to FIG. 24, which stores sections of the CT data. In LW/bitmap buffer 22, the data is stored so as to facilitate rapid retrieval by color manipulation unit 26. For example, the data may be stored in a pixel interleaved format which is the internal format required for color manipulations. CT input buffer 22 is of a size that matches the data formats and data transfer speeds and is typically a $0.25M \times 12$ bit buffer.

Output buffer 30 is a video RAM buffer, similar to the buffer described below with reference to FIG. 24, and is used to convert pixels from the internal pixel interleaved format to the output format, which may be pixel interleaved, lines interleaved, separations interleaved or an output device specific format. Output buffer 30 may also be utilized to incorporate LW, other run length encoded data or specific output device controls and commands into the output stream. By making the serial port of the video RAM the output port, a high speed output rate or high speed output bursts can be achieved. Output buffer 30 is typically $1.0M \times 12$ bits.

The SCSI controller 31 is typically a general purpose SCSI controller, such as the NCR5390 manufactured by NCR, or, preferably, a NCR53C700, also by NCR, and is controlled by controller 20, SCSI controller 31 provides two data channels to the outside world via a Scitex bus and an output bus.

Figure 3:
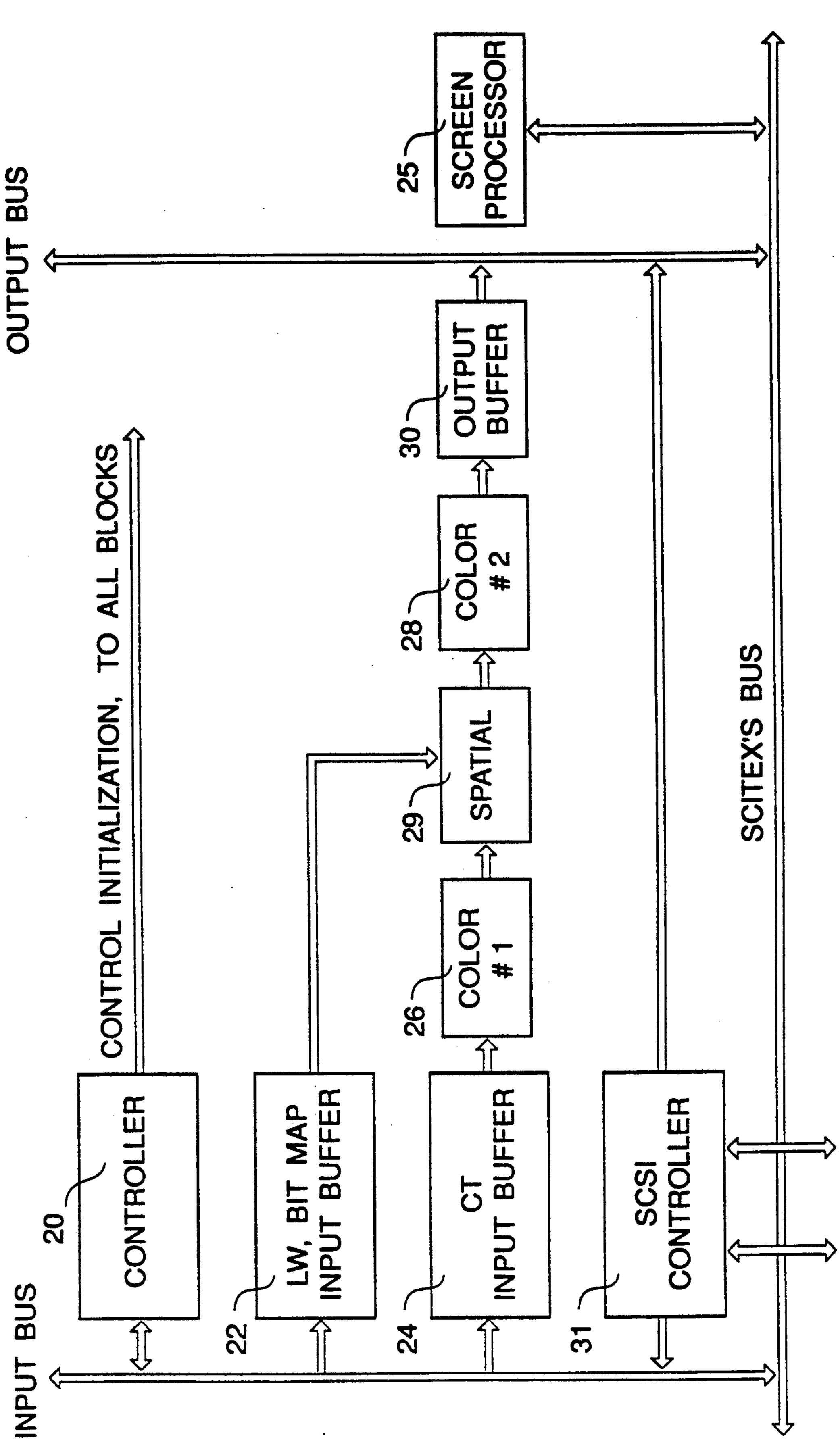
FIG. 3 is a generalized block diagram of a preferred hardware implementation of image processing apparatus constructed and operative in accordance with a third alternative embodiment of the present invention and including a screen processor.
Figure 4:
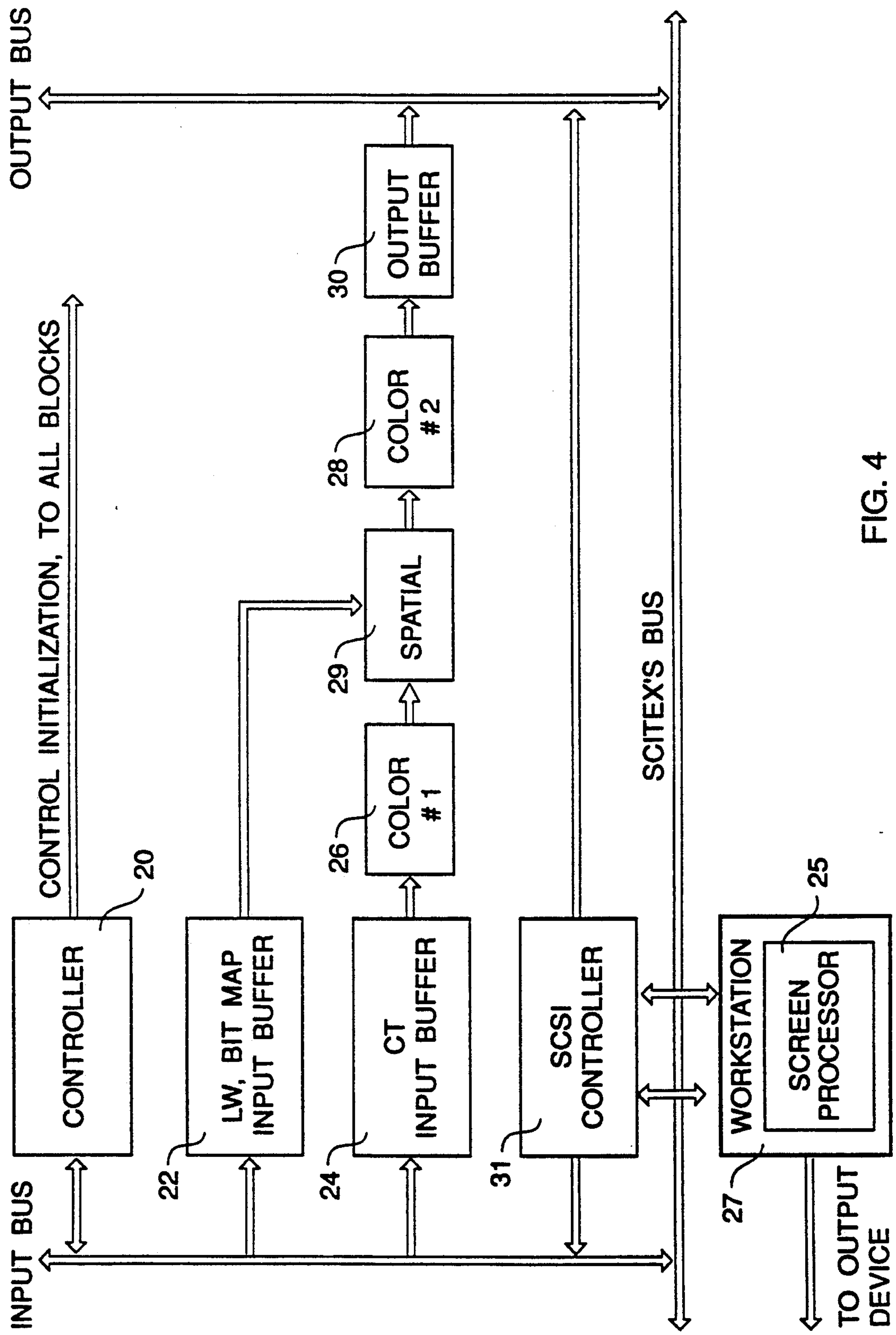
FIG. 4 is a generalized block diagram of a preferred hardware implementation of image processing apparatus constructed and operative in accordance with a fourth alternative embodiment of the present invention and including an I/O workstation comprising a screen processor.

Reference is not made to FIGS. 3 and 4 which are block diagrams of image processing apparatus constructed and operative in accordance with respective third and fourth alternative embodiments of the present invention. The embodiments of FIGS. 3 and 4 are similar to one another and to the embodiment of FIG. 2. Therefore, the reference numbers of FIG. 2 are used in FIGS. 3 and 4 where appropriate. However, a screen processor 25 is added for outputting a screen image to an output device. In FIG. 3, the screen processor 25 comprises the Data 1 and Data 2 boards, manufactured by Scitex Corporation Ltd., Herzlia, Israel. Alternatively, as shown in FIG. 4, the screen processor 25 may be the screen processing unit provided integrally with the I/O Workstation, commercially available from Scitex Corporation Ltd., Herzlia, Israel. This workstation, referenced 27, incorporates the DATA 1 and DATA 2 boards. A SCSI interface may be employed to interface the color and spatial processing units with the workstation 27.

Figure 5:
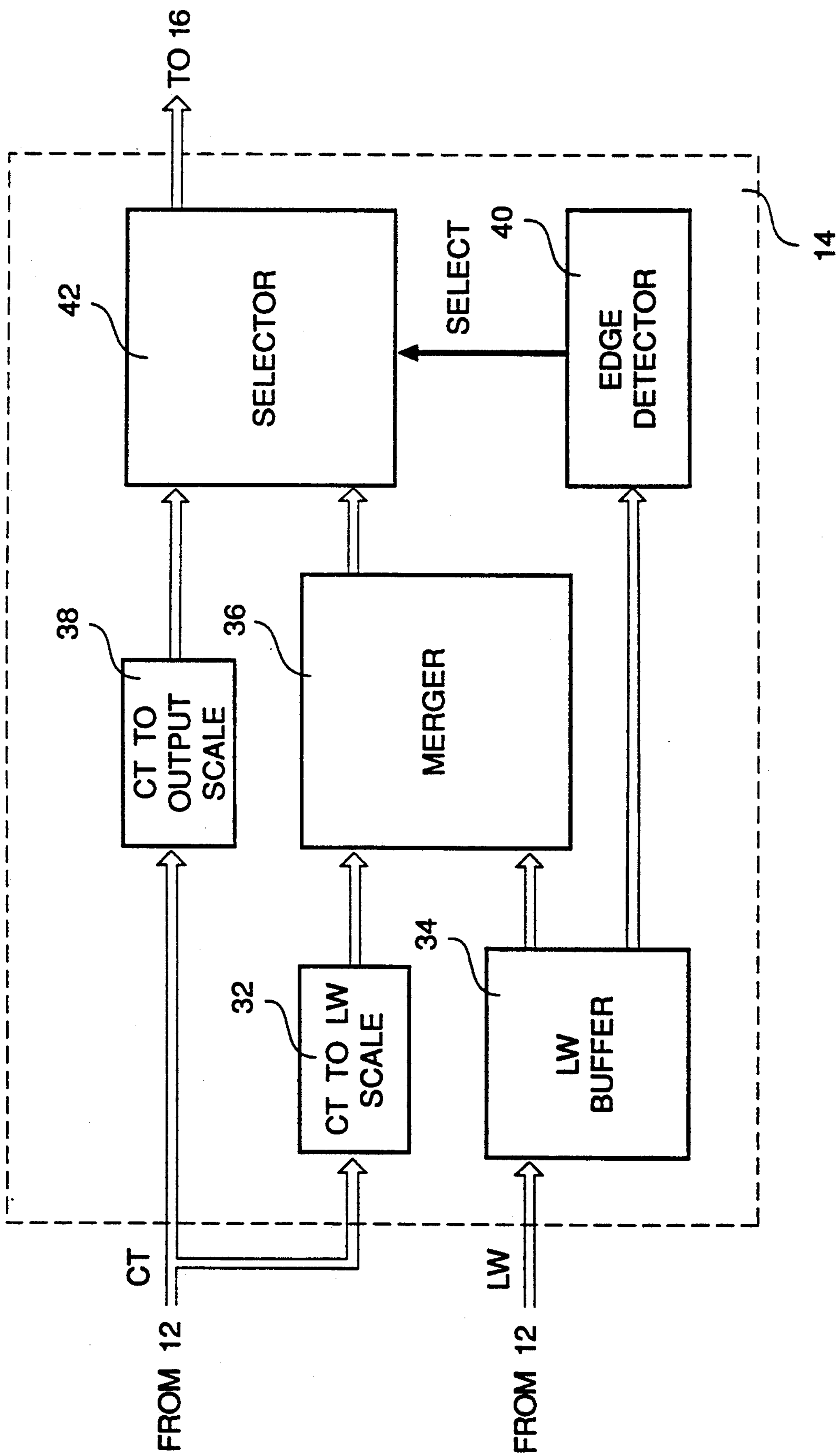
FIG. 5 is a block diagram of spatial processing unit 14 of FIG. 1 constructed and operative in accordance with a first alternative embodiment of the present invention.

Reference is now made to FIG. 5 which is a block diagram of the spatial processing unit 14 of FIG. 1, constructed and operative in accordance with a first alternative embodiment of the present invention. The apparatus of FIG. 5 is also suitable for implementing the spatial processing units of FIGS. 2, 3, 4 and 41. The embodiment of FIG. 5 is particularly suited to software implementation.

The apparatus of FIG. 5, as shown, receives CT data and LW data which may be provided by color processing unit 12 of FIG. 1, preferably in parallel. There is provided scaling means 32 which increases the resolution of the CT data to the LW resolution. This is typically accomplished by a method other than convolution such as averaging, because it is desired to ensure that the output of scaling means 32 is always valid, which is not the case for output derived by convolution methods.

A LW buffer 34 stores a plurality of lines of LW data in the vicinity of the line currently being processed. The number of lines stored by LW buffer 34 is typically a function of the ratio between the resolutions of the input CT data and the input LW data.

A merging unit 36, described in detail hereinbelow with reference to FIG. 6, "opens" the LW data received from LW buffer 34 for the line currently being processed and assigns a color value to each pixel. The color value is determined by the transparency indication of the corresponding LW pixel. If the LW pixel is indicated to be transparent to CT, the CT value, arriving from scaler 32, is assigned to the pixel. Otherwise, the LW value is assigned to the pixel. The output of merger 36 is, therefore, a valid (i.e. non-"garbage") but not necessarily optimal representation of the entirety of the color image.

A scaler 38 performs convolution operations such as resolution change, blur/sharp, etc. on the input CT data. Typically, scaler 38 changes the resolution of the input data to an output resolution, defined by the output device which it is desired to employ. Generally, a convolution-based method of resolution change is employed. The output of the scaler 38 generally comprises preferred values for the corresponding pixels, relative to the values provided by merger 36, with the exception of "invalid" values which have been computed by a convolution process performed upon at least one "garbage" CT pixel. These values are generally not selected for the final representation of the color image, as explained below.

Preferred convolution methods are discussed in detail below.

An edge detector 40 is operative to derive information regarding the locations of borders between LW areas of the image and CT areas of the image and also information regarding the location of the periphery of the image, from the LW data representing a plurality of lines adjacent to the line currently being processed. The LW data is received by the edge detector 40 via LW buffer 34.

A preferred software implementation of the edge detector 40 is based upon a "thickening" method useful in identifying LW pixels which are non-transparent to CT as well as identifying edge pixels, and marking the vicinity thereof. The vicinity of a non-transparent CT pixel, in this context, assuming that 5×5 convolution is to be carried out, is a 5×5 window around the non-transparent CT pixel. The vicinity of an edge, under the same assumption, is the edge pixels and the pixels adjacent to the edge pixels. The marked representation of the image is stored.

When an output value for a particular output pixel is to be computed, the "mark" of the CT pixel covering the center of that output pixel is inspected. If the pixel is marked, this indicates that at least one pixel in the 5×5 convolution window around it is "invalid", which means that a convolution-derived pixel value for that pixel is also invalid. A particular advantage of the marking process is to eliminate repeated inspections of the same pixels when determining whether convolution is a valid procedure for each of a plurality of pixels, by allowing the determination to be made in accordance with the marking on a single pixel rather than in accordance with an inspection of 25 pixels surrounding the single pixel.

For example, the following matrix is a representation of the "validity" of an image, each 1 representing a CT pixel which is entirely covered by non-transparent LW pixel; and each 0 representing a pixel which is at least partly covered by LW pixels which are transparent to CT:

| | | | | | | | | | | | |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 |
| 0 | 0 | 0 | 0 | 0 | 1 | 1 | 0 | 0 | 0 | 0 | 0 |
| 0 | 0 | 0 | 0 | 0 | 1 | 1 | 1 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

Whichever pixels are 0's and are either neighbors of 1's or edge pixels are changed to 1's, thereby to obtain the following "thickened" image:

| | | | | | | | | | | | |
|---|---|---|---|---|---|---|---|---|---|---|---|
| 1 | 1 | 1 | 1 | 1 | 1 | 1 | 1 | 1 | 1 | 1 | 1 |
| 1 | 0 | 0 | 0 | 1 | 1 | 1 | 0 | 0 | 0 | 0 | 1 |
| 1 | 0 | 0 | 0 | 1 | 1 | 1 | 1 | 0 | 0 | 0 | 1 |
| 1 | 0 | 0 | 0 | 1 | 1 | 1 | 1 | 1 | 0 | 0 | 1 |
| 1 | 0 | 0 | 0 | 1 | 1 | 1 | 1 | 1 | 0 | 0 | 1 |
| 1 | 0 | 0 | 0 | 1 | 1 | 1 | 1 | 1 | 0 | 0 | 1 |
| 1 | 1 | 1 | 1 | 1 | 1 | 1 | 1 | 1 | 1 | 1 | 1 |

0 pixels which are neighbors of 1's are again changed to 1's, thereby to obtain the following, twice "thickened" image:

| | | | | | | | | | | | |
|---|---|---|---|---|---|---|---|---|---|---|---|
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 0 | 1 | 1 | 1 | 1 | 1 | 1 | 1 | 1 | 1 |
| 1 | 1 | 0 | 1 | 1 | 1 | 1 | 1 | 1 | 1 | 1 | 1 |
| 1 | 1 | 0 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

The term "neighbors" here refers to the eight pixels which are directly adjacent to the current pixel, either horizontally, vertically or along a diagonal. Alternately, the term "neighbors" may be employed to refer to the four pixels which are directly adjacent to the current pixel either horizontally or vertically.

It is appreciated that the thickening process varies as a function of the size of the convolution matrix. For example, for 3×3 convolution, the image is "thickened" once, rather than twice.

Referring again to FIG. 5, selector 42 selects, for each output pixel, a value to be assigned thereto, in accordance with the information received by selector 42 from edge detector 40. If the information received from detector 40 indicates that the convolution used to compute the pixel value output by scaler 38 was based upon invalid CT pixels, in other words, if the pixel was "marked" by the thickening process, the value received from merger 36 is selected to represent the pixel. Otherwise, if the pixel was not "marked", indicating that the pixel value computed by a convolution process is valid, the pixel value output by scaler 38 will be assigned to the pixel. Selector 42 then provides an output indication of the final representation of the image.

The system of FIG. 5 can accept a third input stream which is in the format of a bitmap, for text files, by performing a logical OR operation between the third input stream and the decoded, but not yet averaged, LW value in merger 36 and then supplying the result to the portion of merger 36 which changes the resolution.

If more than one color separation is to be processed simultaneously, a single spatial processing unit 14 may operate on each color separation in turn. According to a first alternative embodiment of the present invention, a single LW representation of the image pertains to all four separations and therefore the same LW data is used for all separations of each pixel. Alternatively, a plurality of associated LW representations may be provided, corresponding to the plurality of separations.

The system of FIG. 5 preferably has a plurality of user-selectable modes of operation. Five preferred modes are now described.

The first mode is capable of inputting CT, LW or, preferably, bitmap files, and outputting them in CT format. The first mode is useful for printing merged files on various output devices and for processing the files and passing them to a storage unit or other processing unit. It will be appreciated that this is the most general mode, the other modes discussed hereinbelow being specialized cases of this first mode.

A second mode is preferably provided for scaling LW files and converting them into CT format. This mode is useful for printing LW files on CT output devices or for processing them and passing them to a storage unit or other processing unit. In this mode, which is restricted to LW processing and outputting through the selector 42, only the merger 36, the edge detector 40 and the selector 42 are utilized. The LW data, stored in buffer 34, is "opened" and converted to CT format and is then scaled by the merger 36 and an output signal is provided to selector 42.

A third mode is preferably provided for handling only CT files. This mode is useful for printing CT files on CT output devices or other output devices which handle CT format. It is also useful for processing CT files and for passing them to a storage unit or other processing unit. In this mode, since the entire input file is in CT format, the input is always valid. The mode is restricted to CT processing and outputting through the selector 42 and thus, only scaler 38 and selector 42 are used. A convolution process is performed by scaler 38 which may change the resolution of the data and/or may perform other convolution functions such as sharpening, blurring and simple pattern extraction, wherein the appropriate convolution matrix coefficients dictate the type of convolution to be performed. The selector 42 outputs the CT data.

A fourth mode is preferably provided for merging CT and/or LW and/or bitmap files. This mode provides high quality, relatively fast merging of the input, as well as format conversion and unification. The output files are directed to an appropriate output device, to a storage unit or to another processing unit. In this mode, LW and CT files can be merged into files with CT input resolution. All components of the embodiment of FIG. 5 are operative and the convolution operation does not affect the CT file. The files are merged by selector 42 which also outputs the merged file. Optionally, scaler 32 can be utilized to merge a bitmap file with the merged file.

Figure 6:
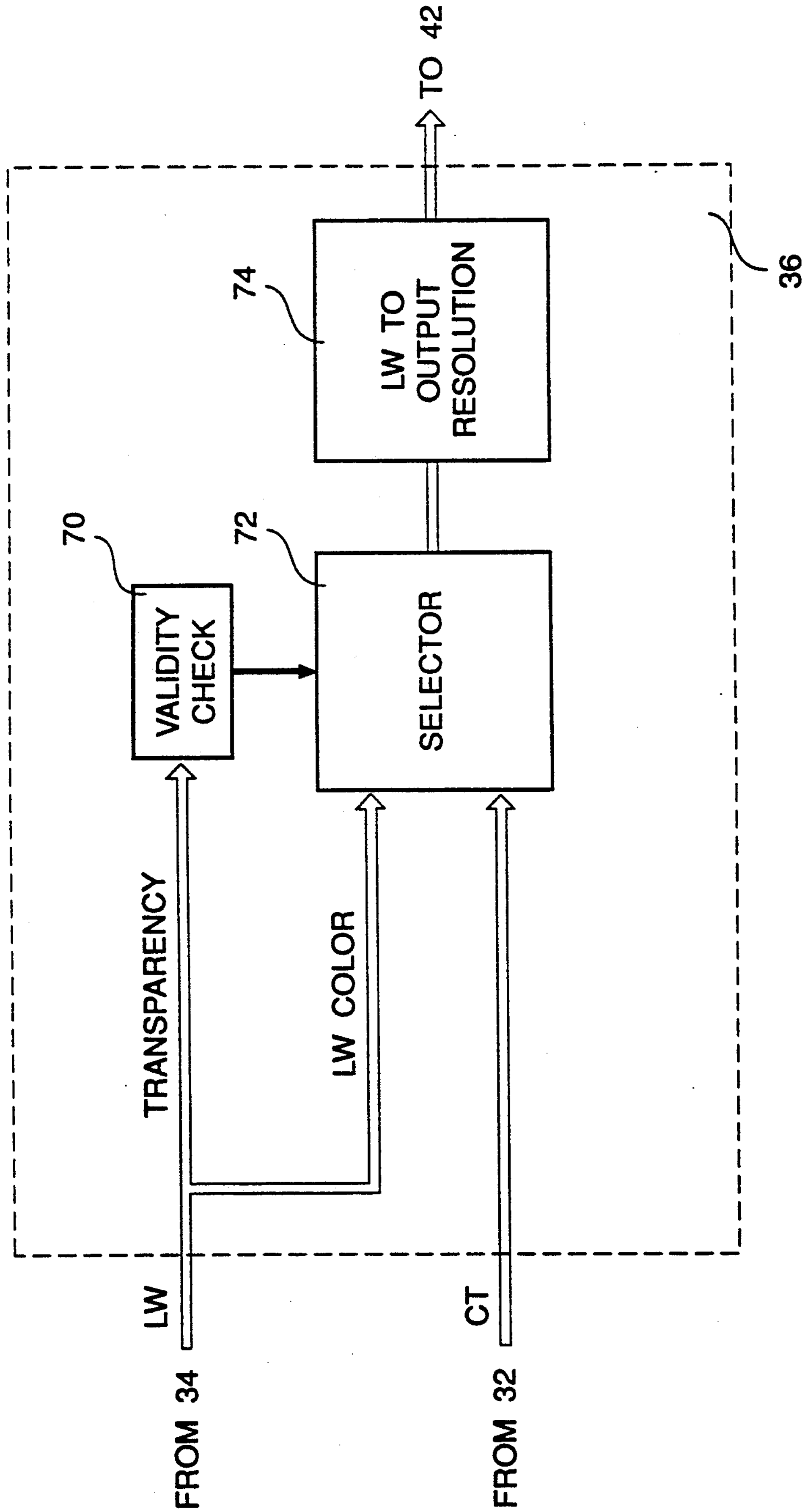
FIG. 6 is a block diagram of merger 36 of FIG. 5.

Reference is now made to FIG. 6, which is a block diagram of the merger 36 of FIG. 5. As stated hereinabove, merging unit 36 opens the LW data for the line currently being processed and assigns a color value (either the color value of the CT pixel or the color value of the LW pixel) to each pixel of the color image. The value which is assigned to the pixel is determined by the transparency of the corresponding opened LW pixel. If the pixel is indicated by a transparency determining unit 70 to be transparent, a selector 72 assigns the CT value arriving from scaler 32 of FIG. 5 to the pixel. Otherwise, selector 72 assigns the LW value arriving from buffer 34 to the pixel. The resolution of the output of selector 72 is then changed to the output resolution by scaler 74, preferably by averaging. The output of merger 36 is, therefore, a valid (i.e. non-"garbage") but not necessarily optimal representation of the entirety of the color image.

Figure 7:
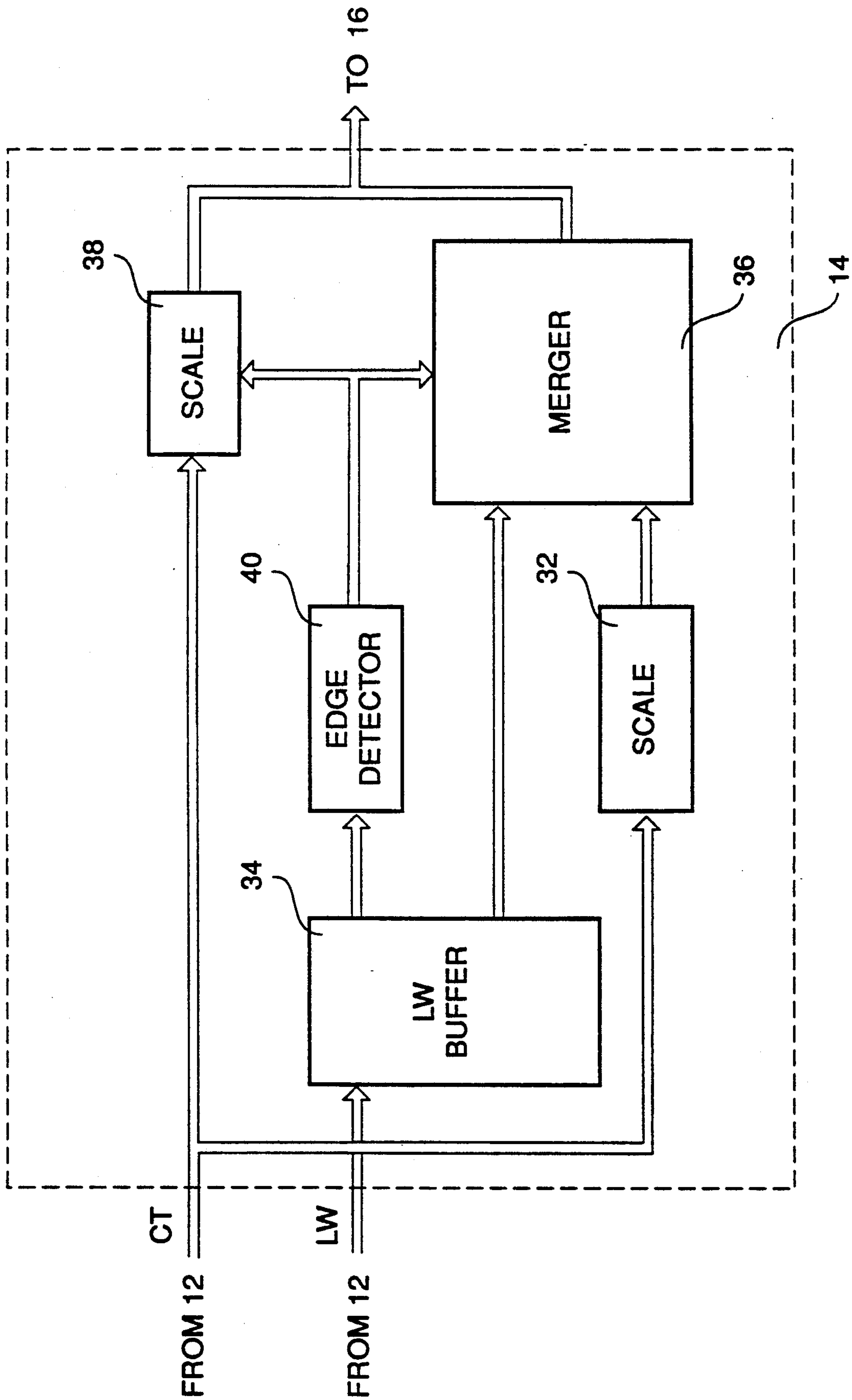
FIG. 7 is a block diagram of spatial processing unit 14 of FIG. 1 constructed and operative in accordance with a second alternative embodiment of the present invention.

Reference is now made to FIG. 7, which is a block diagram of spatial processing unit 14 constructed and operative in accordance with a second alternative embodiment of the present invention. Elements common to this embodiment and to the embodiment of FIG. 5 are identically numbered, for convenience. The apparatus of FIG. 7 generally resembles the apparatus of FIG. 5, with the exception that selection between the outputs of scaler 38 and of merger 36 is performed directly by edge detector 40, which is operative to turn either one of scaler 38 and merger 36 on and the other one off, in accordance with the edge location information computed from the LW data received from the LW buffer 34. The embodiment of FIG. 7 is particularly suited to software implementation.

Figure 8:
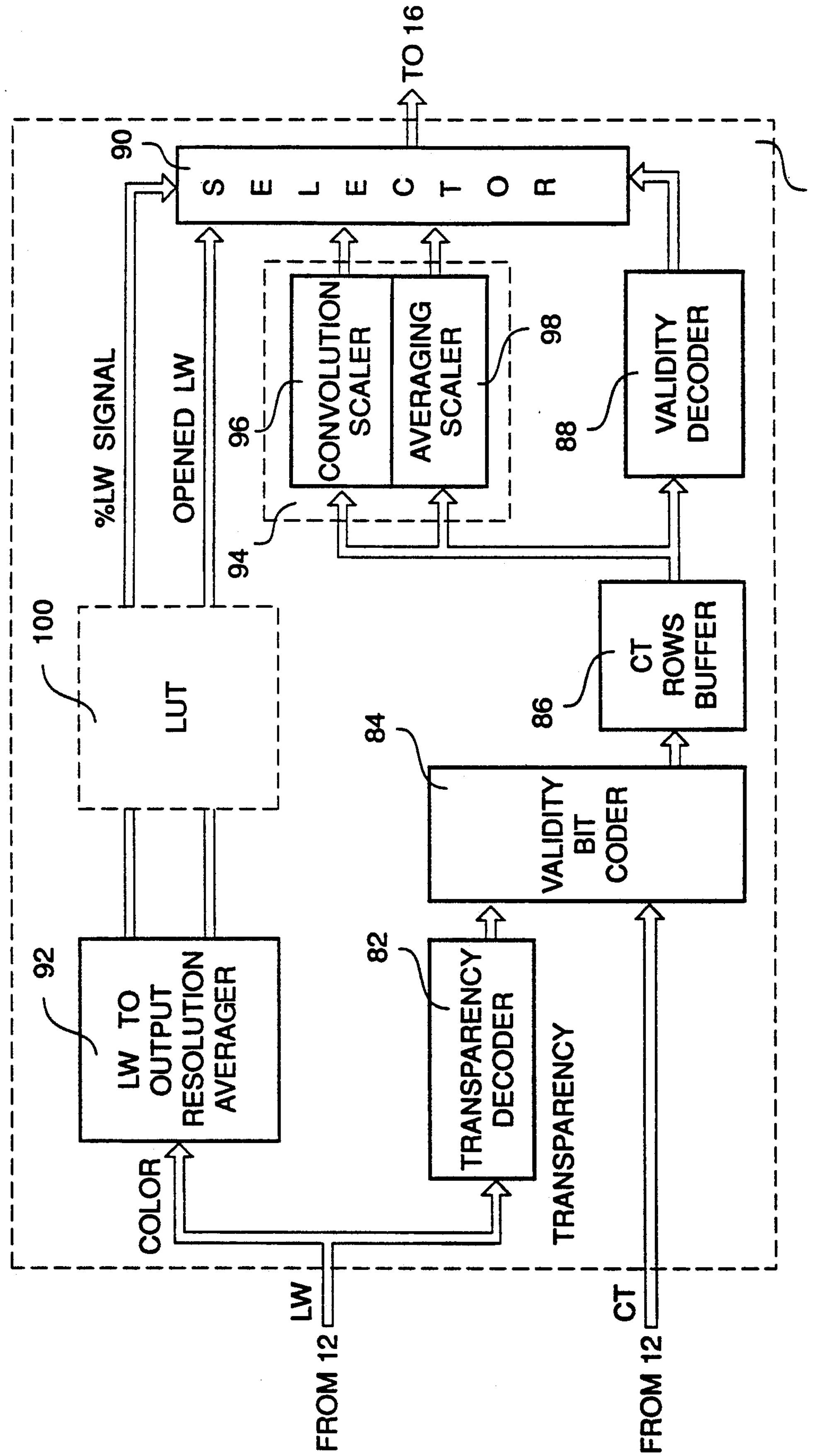
FIG. 8 is a block diagram of spatial processing unit 14 of FIG. 1 constructed and operative in accordance with a third alternative embodiment of the present invention and being particularly suited to hardware implementation.

Reference is now made to FIG. 8 which is a block diagram of spatial processing unit 14 constructed and operative in accordance with a third preferred embodiment of the present invention particularly suited to hardware implementation. Whereas the embodiment of FIG. 5 employs a "thickening" method for edge detection, the apparatus of FIG. 8 employs a validity bit encoding method. The difference between the two embodiments is that in the "thickening" embodiment of FIG. 5, averaging is carried out by merger 36 at LW resolution, which is typically relatively high, while in the validity bit encoding embodiment of FIG. 8, averaging is carried out at CT resolution, which is relatively low.

In the embodiment of FIG. 8, a transparency decoder 82 uses the indication of transparency of incoming LW data to compute an additional bit of information, termed herein the "validity bit", for each CT pixel, representing the validity of that CT pixel. Preferably, the validity bit is given a value of 1 if at least one of the LW pixels which overlap the CT pixel, partially or completely, is transparent. If none of the overlapping LW pixels are transparent to CT, the validity bit is given a value of 0. The validity bit is then implanted by a coder 84 into the appropriate CT data element.

A plurality of CT rows in the vicinity of the CT pixel being processed are stored in a CT rows buffer 86. A validity decoder 88 extracts the validity bit of each CT pixel in the vicinity being processed and provides a selector 90 with an indication of whether or not the output pixel being processed has a "valid" vicinity. In other words, validity decoder 88 provides an indication of whether the convolution window surrounding the output pixel being processed is entirely valid, in which case convolution is a valid and generally preferred method for computing the color value of the output pixel.

An averager or other scaling device 92 reduces the LW resolution to the output resolution. The averager also opens the LW format and computes % LW, the LW percentage signal, which is the percentage of each of the relatively large output pixels which is to be defined only by the relatively small LW pixels, i.e. the percentage of the output pixel which is non-transparent to CT. The opened LW data and also the % LW signal are received by selector 90.

A scaling unit 94 comprises two scalers 96 and 98 which are both operative to change the resolution of the input CT data to the output resolution, each using a different method. Scaler 96 typically uses a method based on convolution. Convolution is the preferred method, assuming that the vicinity of the pixel being convolved contains no invalid pixels, which assumption is checked by validity decoder 88. Scaler 98 uses a method which yields output which is of poorer quality than the output of scaler 96, but has the advantage of always being valid, regardless of the validity of the vicinity of the pixel being scaled. Typically, the scaler 98 employs an averaging method, averaging only those CT pixels which are valid, as indicated by the "validity" bit, and only those LW pixels which are nontransparent.

Selector 90 is operative to select a value for the output pixel from among the following: the LW output of averager 92, the output of scaler 96, the output of scaler 98, or some combination of the above. Selector 90 typically assigns a value to the pixel being processed as a function of the "validity" signal output of decoder 88 and the LW percentage signal output of averager 92, as follows:

If the output of the decoder is zero, then the convolution performed by scaler 96 is valid and the output of scaler 96 is assigned to the present pixel.

If the output of the decoder is greater than zero, then:

if % LW is zero, the output of scaler 98 is assigned to the present pixel;

if % LW is 100, the LW value output by averager 92 is assigned to the present pixel;

if % LW is between 0 and 100, the value assigned to the present pixel is some combination of CT and LW, such as according to one of the following formulae:

a. present pixel value $=0.01\times(\%\,LW\times LW+(100-\%\,LW)\times CT)$ b. present pixel value $=100-100(1-LW/100)^{\%LW/100}(1-CT/100)^{1-\%LW/100}$ It is noted that, in formulae a and b, if LW=0% dot, the CT is unaffected by the LW value. If LW=100% dot, the result is unaffected by the CT value. All variables are given in % dot. Variable definitions are as follows:

% LW = LW percentage signal output of averager 92, i.e. the percentage of the area of the output pixel being processed which is "non-transparent" to CT, assuming all areas are either "transparent" or "non-transparent" to CT. More generally, the transparency may be defined to have more than two values, i.e. there may be values t intermediate t=100% (complete transparency) and t=0% (complete non-transparency) In this case, % LW is computed by partitioning the output pixel into a plurality of L locations, each having a transparency percentage $t_i$ and an area $a_i$ (i=1 . . . L) respectively, and defining % LW as the sum, over the L locations, of $a_i(100-t_i)$;

LW = the "opened" LW value output by averager 92;

CT = the output of scaler 98.

Optionally, the % LW used for the above averaging procedure may be passed through a LUT 100 which is constructed in a suitable manner, e.g. the LUT may be constructed so as to provide output with a desired non-linearity, such as output in which a particular separation is emphasized. The look up table (LUT) 100 is provided between averager 92 and selector 90. The LUT 100 receives the % LW signal provided b y averager 92 and uses it to determine the weight to be given to the LW data when it is merged with the CT data by selector 90. Different weightings may be used for different separations, as when it is desired to emphasize text printed using only the black separation.

Decoder 82 and averager 92 are designed to be suitable for the particular LW format employed and may be based on any suitable relatively fast processor incorporating multipliers, such as the digital signal processor known as TMS320C30, commercially available from Texas Instruments, or, preferably, the digital signal processor known as DSP96002, commercially available from Motorola, Phoenix, Ariz., USA. According to a preferred embodiment, decoder 88, scaler 96 and scaler 98 all operate in parallel.

The embodiment of FIG. 8 may, alternatively, provide output in LW format if averager 92 is constructed and operative not to "open" the LW data. This allows the apparatus of FIG. 8 to provide both CT and LW files. The files may then be provided to a high quality output device, such as the Dolev or Raystar laser plotters manufactured by Scitex Corporation of Herzliya, Israel, to supply high quality printed output.

The system can accept a third input stream which is in the format of a bitmap, for text files, by performing a logical OR operation between the third input stream and the decoded, but not yet averaged, LW value in averager 92. To do this, a LW percentage value of 100% is sent to the selector 90.

If more than one color separation is to be processed simultaneously, a separate rows buffer 86 is preferably provided for each color separation. Validity bit coder 84 may be operated sequentially on each color separation. If a single LW representation is provided for all four separations, the decoder 88, selector 90 and scaling unit 94 may operate with the same LW data for all separations of each pixel. Also, the elements downstream of buffer 86 need only be implemented once because the LW data provides information related to all of the CT separations.

The embodiment of FIG. 8 preferably has several modes of operation. The first, most general mode is operative to receive CT, LW and optionally, bitmap files, and output them in CT format. Alternatively, the LW or the bitmap files can be output in a run-length format. This first mode is useful for printing merged filed on various output devices, or for processing the files and passing them onto a storage unit or other processing unit. It will be appreciated that the first mode corresponds to the most general configuration of the apparatus of FIG. 8.

A second mode is preferably provided for scaling LW files and for subsequently printing them in LW format. This mode is useful for printing LW files on high quality output devices or for processing LW files and passing them to a storage unit or other processing unit. Only the LW averager 92 and the selector 90 are used. The LW is decoded and scaled by LW averager 92 and then coded back to LW run length format, also by LW averager 92.

A third mode is preferably provided for scaling LW files and for subsequently printing them in CT format. This mode is useful for printing LW files on CT output devices or for processing them and passing them to a storage unit or other processing unit. In this mode, incoming LW is decoded, converted to CT format and scaled by the averager 92 and is then output via selector 90.

A fourth mode is preferably provided for processing CT files. This mode is useful for printing CT files on CT output devices or other output devices which can handle CT format. It is also useful for processing CT files and for passing them to a storage unit or other processing unit. In this mode, the entire input file is in CT format and so may be assumed to be entirely valid.

In the fourth mode, coder 84 passes the entire CT file to the row buffer 86, having planted a "valid" CT bit in each pixel. At the scaler 96, a convolution operation is performed which may change the resolution of the CT file and/or perform other convolution functions such as sharpening, blurring, simple pattern extraction, the convolution matrix coefficients being determined by the type of convolution to be performed. The selector 90 always outputs the CT data.

A fifth mode is preferably provided for merging CT and/or LW and/or bitmap files without changing resolution. This mode provides high quality, fast merging of input files, as well as format conversion and unification. The resultant files are then directed to an output device, to a storage unit or to another processing unit.

In the fifth mode, input LW and CT files can be merged into one file in CT resolution , as follows: The LW file is decoded and scaled to the CT resolution by averager 92. Coder 84, buffer 86 and decoder 88 are all operative and scalers 96 and 98 perform a "unity" scaling, i.e. a scaling procedure that does not change the CT resolution. The files are merged at selector 90 which also outputs the merged file. Optionally, as described hereinabove, averager 92 may be constructed and operative to allow a bitmap file to be added to the merged file by performing a logical OR between the bitmap stream and the decoded but not averaged LW file.

Figure 9:
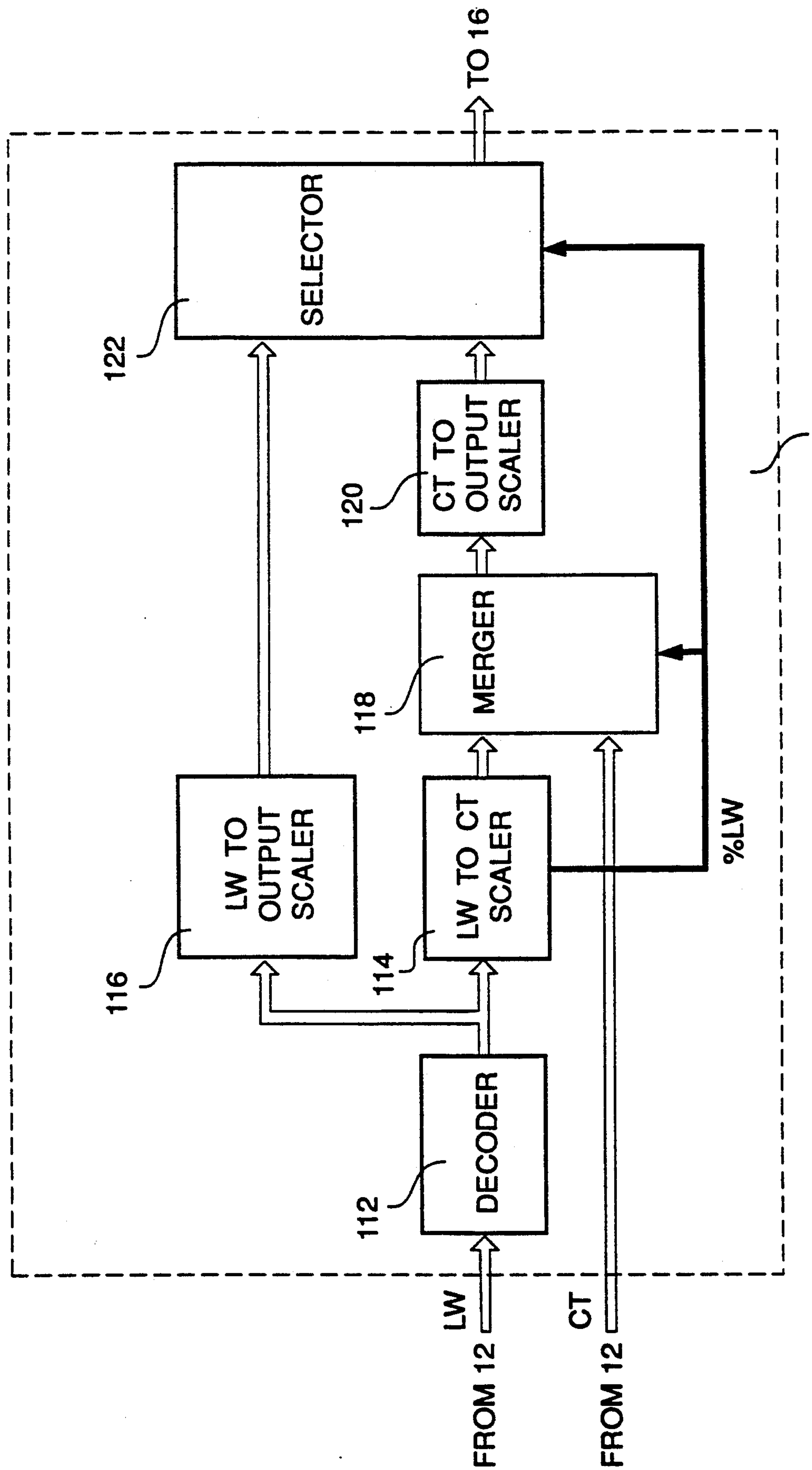
FIG. 9 is a block diagram of spatial processing unit 14 of FIG. 1 constructed and operative in accordance with a fourth alternative embodiment of the present invention.

Reference is now made to FIG. 9 which is a block diagram of spatial processing apparatus constructed and operative in accordance with a fourth alternative embodiment of the present invention.

In FIG. 9, incoming LW data is opened by a decoder 112 and then its resolution is changed to the CT resolution by a scaler 114.

LW to CT scaler 114 is also operative to compute a % LW signal and supply it to a merger 118 and to a selector 122. Merger 118 merges the LW and CT data, using a suitable combining method, such as that defined by the following formula:

$$CT \text{ pixel value} = 0.01 \times (LW \times LW\% + CT(100 - LW\%)).$$

where LW and CT are the LW and CT pixel values in % dot, at CT resolution, input by the merger 118. It is noted that the output of the merger is always valid, unlike the CT input, which, if directed indiscriminately to a convolution process, would generally provide at least some invalid results.

The merged output is then scaled to the output resolution by a scaler 120 which may be a convolution based scaler similar to convolution based scaler 96 of FIG. 8. The output of scaler 120 is a complete representation of the color image, at output resolution, which has been computed by "valid" methods. However, the output of scaler 120 may have a number of drawbacks:

a. Information may have ben lost en route, since the resolution of the original LW representation of the color image was first reduced to the low CT resolution level and subsequently was restored to, or reduced further to, the output level which may be higher or lower than the CT resolution level but is generally lower than the LW resolution level.

b. The characteristics of the peripheries of the LW areas of the color image may be somewhat "smeared" into the adjacent peripheries of the adjacent CT areas of the color image, and conversely, the characteristics of the peripheries of the CT areas of the color image may be somewhat "smeared" into the adjacent peripheries of the adjacent LW areas of the color image.

Therefore, according to a preferred embodiment of the present invention, a scaler 116 and a selector 122 are provided as shown, although they are not necessary to the operation of the embodiment of FIG. 9, in order to substantially overcome the two above-mentioned drawbacks. Scaler 116 "opens" the LW data, i.e. converts it to pixel-by-pixel format, and then changes the LW resolution directly to the output resolution.

Selector 122 is operative to select whether the output of scaler 120 or the output of scaler 116 will be output from the selector, using the LW % value as a criterion. Specifically, if LW %=100, this indicates that the LW is "non-transparent" to CT, at the location of the image being processed, and the LW output of scaler 116 is selected. Otherwise, the output of scaler 120 is selected.

The embodiment of FIG. 9 can alternatively produce output in LW format if LW scaler 116 operates in LW format rather than in "opened" format. Thereby, the system can produce either CT or LW files. The files may then be plotted by a high quality output device, such as the Dolev or Raystar laser plotters manufactured by Scitex Corporation of Herzliya, Israel, to supply high quality printed output.

The system can optionally accept a third input which is in the format of a bitmap, for text files, by performing a logical OR operation between a third input stream and the output of scaler 116 and then supplying the result to selector 122, thereby to ensure that the third input will always be selected.

If more than one color separation is to be processed simultaneously, merger 118, scaler 120 and selector 122 may be duplicated for each color separation or alternatively, these elements may operate with the same LW data for all color separations for each pixel. If a single LW representation is provided for all four separations, the remaining elements need only be implemented once.

A look up table (not shown) may optionally be provided between scaler 114 and merger 118. The LUT may receive the % LW signal generated by scaler 114 and determine the weighting given to the LW data when it is combined with the CT data in merger 118. If desired, different weighings for different separations may be used, such as to emphasize text that is printed using only the black separation.

The system of FIG. 9 has many different modes of operations. It can handle CT, LW and optionally, bitmap files, which are output in a CT format. Alternatively, the LW and bitmap files can be output in a run-length format. This first mode is useful for printing merged files on various output devices, or for processing the files and passing them to a storage unit or other processing unit. It will be appreciated that the first mode corresponds to the most general configuration of the apparatus of FIG. 9.

A second mode is preferably provided for scaling LW files and subsequently printing them in LW format. This mode is useful for printing LW files on high quality output devices or for processing LW files and passing them to a storage unit or other processing unit.

A third mode is preferably provided for scaling LW files and for subsequently printing them in CT format. This mode is useful for printing LW files on CT output devices or for processing them and passing them to a storage unit or other processing unit.

A fourth mode is preferably provided for handling only CT files. This mode is useful for printing CT files on CT output devices or other output devices which can handle CT format. It is also useful for processing CT files and for passing them to a storage unit or other processing unit. The convolution matrix coefficients are determined by the type of convolution to be performed.

A fifth mode is provided for merging CT and/or LW and/or bitmap files without changing resolution. This mode preferably provides high quality, fast merging of input files, as well as format conversion and unification. The resultant files are then directed to an output device, to a storage unit or to another processing unit.

In all of the above embodiments of spatial processing apparatus, convolution is a preferred method for implementing the various CT scalers. The drawback of convolution as a scaling method is that it is invalid if even one of the pixels used is "invalid", i.e. corresponds to a non-transparent area of the LW image, as explained hereinabove. It is noted that a CT pixel is preferably defined as invalid only if the entirety of the area of the color image defined thereby corresponds to an entirely nontransparent area of the LW image. If the LW image is even partially transparent to even a portion of the area of a particular CT pixel, the CT pixel is preferably defined as valid.

There follows a discussion of convolution and a presentation of hardware implementations of preferred convolution apparatus useful, inter alia, in implementing scaler 96 of FIG. 8.

General convolution and orthogonal convolution and methods for computing convolution coefficients are discussed in the following documents, the disclosures of which are incorporated by reference:

1. Schowengerdt, R. et al, "Topics in the two dimensional sampling and reconstruction of images", Int. J. Remote Sensing, 1984, Vol. 5(2), pp. 333–347.

2. Park, S. K. et al, "Image Reconstruction by parametric cubic convolution", Computer Vision, Graphics and Image-Processing, 23, 258–272, Jul. 27, 1982.

3. Hall, E. L. *Computer Image Processing and Recognition*, particularly pages 390–413. Academic Press, 1979, New York.

4. Baxes, G. A. *Digital Image Processing*, particularly pp. 2, 48, 50, 144, 149–150, 160. Prentice-Hall, Englewood Cliffs, N.J., 1984.

Generally, it has ben found that many convolution operations can be performed in the X and Y directions independently.

This type of convolution process is termed herein "orthogonal convolution". In orthogonal convolution, a given convolution operation can be separated into two independent X and Y convolutions such that the result of sequentially operating the X and Y convolutions on given input are substantially identical to the results of operating the original convolution on the same input. This is done by defining row and column parameters $c_{i.}$ and $c_{.j}$ where $i=1 \ldots n$, $j=1 \ldots m$ ($n \times m$ being the dimensions of the original convolution matrix $C_{ij}$), such that for every i and j, the i,j matrix coefficient is equaled to the product $c_{i.} \times c_{.j}$. The advantages of performing convolution in the X and Y directions independently are, first, that less coefficients need be stored (approximately n row parameters+m column parameters, rather than $n \times m$ convolution matrix coefficients), and second, that less operations need be carried out.

The letters n and m refer to the dimensions of the convolution "window". n is the number of rows and m is the number of columns. Typically $n=m$. Typical values for n and m are 3 or 5, corresponding to first and second order operations respectively.

Figure 10:
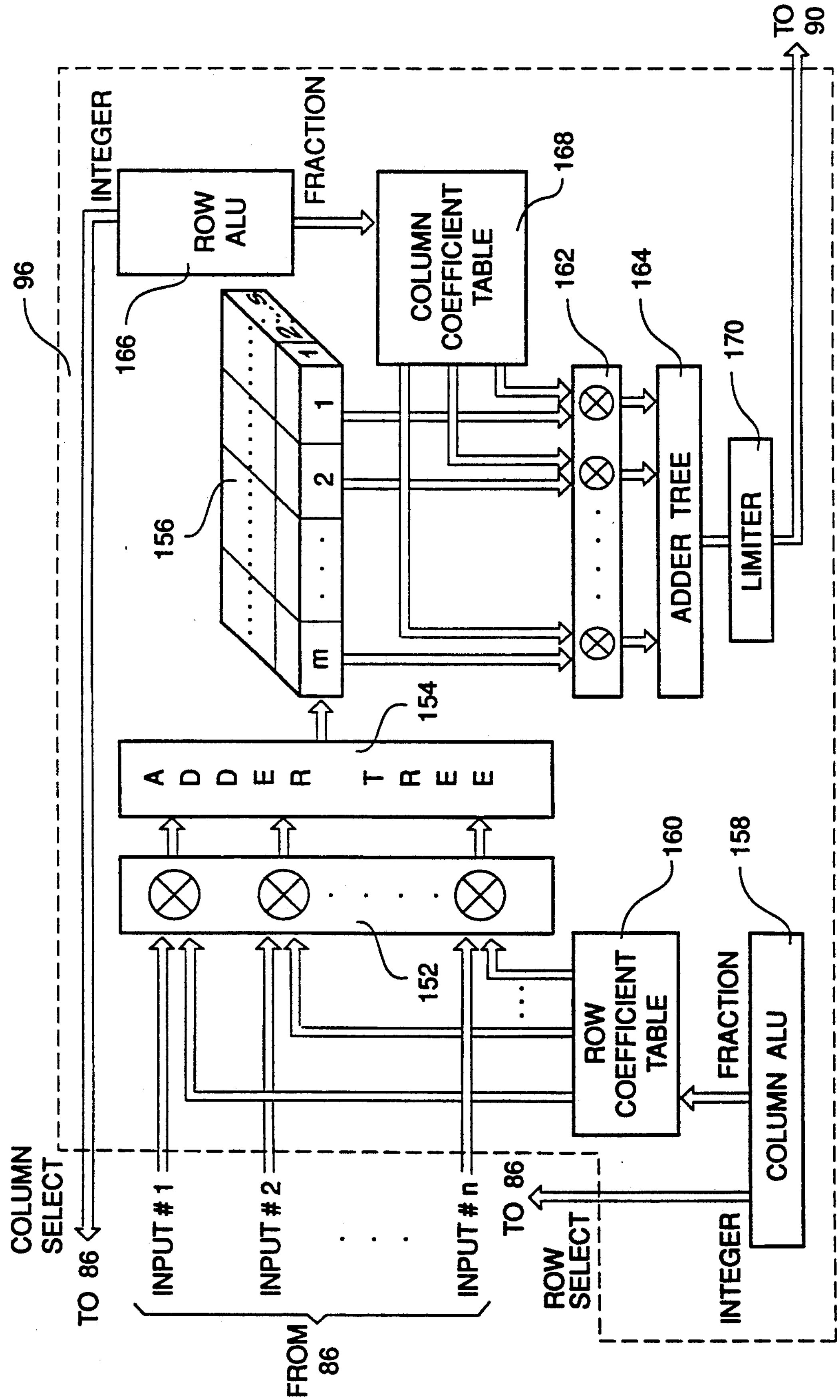
FIG. 10 is a block diagram of convolution scaler 96 of FIG. 8 constructed and operative in accordance with a preferred embodiment of the present invention.

Reference is now made to FIG. 10, which is a block diagram of scaler 96 of FIG. 8 constructed and operative in accordance with a first alternative embodiment of the present invention based on orthogonal convolution methods.

The particular features of the orthogonal convolution method of FIG. 10 will now be described.

The stream of CT pixels representing the color image being processed comprises a plurality of sequences $s_i$ of CT pixels, each sequence representing a row i of the color image. Sequence i comprises all pixels $p_{ij}$ ($j=1 \ldots r$, where r is the number of pixels per row). A suitable number of sequences, such as 20 to 200 sequences, from among the many thousands of sequences defined by the color image, are stored in a dual port row buffer such as rows buffer 86 of FIG. 8. Preferably, 5 sequences of CT pixels may be simultaneously retrieved by rows buffer 86. Therefore, rows buffer 86, at a given clock, is operative to simultaneously provide five pixels from the same column of each of five respective adjacent rows to a multiplier array 152 of FIG. 8. At the top and at the bottom of the color image, the five simultaneously retrievable sequences may not correspond to five adjacent rows of the image, but rather may correspond to only three or four adjacent rows of the image, the first or last of the rows being repeated more than once, as shown and described in detail below. This is because rows may be missing at the top and at the bottom of the color image.

For example, when row 1 is being processed, two rows are available "ahead" of row 1, namely rows 2 and 3. However, no two rows are available "behind" row 1. Therefore, the two rows "behind" row 1 are both defined as row 1. So the $5 \times 5$ convolution window for each pixel in row 1 comprises five pixels each from rows 1, 1, 1, 2 and 3. Similarly, when the second row of the image is being processed, two rows are available "ahead" of row 2, namely rows 3 and 4. However, only one row is available "behind" row 2, namely row 1. Therefore, the second row "behind" row 1 is also defined as row 1, and the $5 \times 5$ convolution window for each pixel in row 2 comprises five pixels each from rows 1, 1, 2, 3 and 4.

The 5 simultaneously retrievable sequences of CT pixels within rows buffer 86 of FIG. 8 change over time. The following table shows the 5 sequences stored in rows buffer 86 during seven consecutive convolution cycles, corresponding to seven adjacent output pixels, for a variety of output resolution:CT resolution ratios:

| output | convolution cycles | | | | | | |
|---|---|---|---|---|---|---|---|
| CT | 1 | 2 | 3 | 4 | 5 | 6 | 7 |
| 1 | 11123 | 11234 | 12345 | 23456 | 34567 | 45678 | 56789 |
| 3 | 11123 | 11123 | 11123 | 11234 | 11234 | 11234 | 12345 |
| 1/3 | 11123 | 23456 | 56789 | 8–12 | 11–15 | 14–18 | 17–21 |
| 2.5 | 11123 | 11123 | 11123 | 11234 | 11234 | 12345 | 1–5 |
| 0.4 | 11123 | 23456 | 45678 | 7–11 | 9–13 | 12–16 | 14–18 |

In the forgoing discussion, indices i, j, k and l will be used to denote the following:

i: a position along the vertical axis of, or a row of, the image;

j: a position along the horizontal axis of, or a column of, the image;

k: a position along the vertical axis of, or row of, the convolution coefficient matrix; and l: a position along the horizontal axis of, or column of, the convolution coefficient matrix.

In conventional non-orthogonal convolution methods, the convolution coefficient set is represented by a coefficient matrix $C_{kl}$. In orthogonal convolution, however, the convolution coefficient set is represented by a first set of row coefficients $c_{k.}$ and by a second set of column coefficients $c_{.l}$. Therefore, less coefficients need be stored in orthogonal convolution. For example, in $5 \times 5$ convolution, a matrix of coefficients contains 25 coefficients, whereas the two sets of row and column coefficients contain 5 coefficients each, giving a total of only 10 coefficients.

A particular advantage of orthogonal convolution is that it is possible to reuse partial results of a convolution computation performed on a first "window" of CT data when performing the convolution computation of an adjacent second "window" of CT data.

Specifically, the 5'5 convolution computation on the first "window" of CT pixels defined in the image $p_{ij}$, namely the first five pixels of the first five rows, or all $p_{ij}$ for which i and j are both less or equal than 5, is as follows:

$$\text{Convolution result} = 1/25 \times sum_j[c_j(sum(c_i p_{ij}))]$$

where summations over i and over j are both from 1 to 5.

The apparatus of FIG. 10 operates in the following two stages:

a. The column convolutions are computed. $Sum_i(c_{i.}p_{ij})$ is computed for each j from 1 to 5, resulting in five partial results $p_{.1}, \ldots, p_{.5}$. This step is performed by multiplier array 152, adder tree 154, column ALU 158 and row coefficient table 160, which stores the row coefficients $c_{i.}$. In order to clarify the terminology employed here, it is emphasized that the row coefficients are employed to compute the column convolution results, also termed partial results; whereas the column coefficients are employed to compute the row convolution result, which is the weighted sum of five column convolutions or partial results.

b. The row convolution is computed. Specifically, the sum of $c_{.j}p_{.j}$, for all j from 1 to 5, is computed. This step is performed by multiplier array 162, adder tree 164, row ALU 166 and column coefficient table 168, which stores the column coefficients $c_{i.}$.

It is noted that when the apparatus of FIG. 8 operates on the second "window" of CT pixels, some of the five partial results of step a may be "reused" instead of being computed anew.

The number of partial results used for computing a first output pixel which may be reused in order to compute a second adjacent output pixel along the same row depends on the ratio between the CT resolution and the output resolution. For example:

EXAMPLE 1

If output resolution: CT resolution is 1:1, then the CT pixel window corresponding to the second output pixel is obtained by displacing the CT pixel window corresponding to the first output pixel sideways by one CT pixel. Therefore, four of the five partial results used for the first output pixel may be reused when computing the second output pixel.

EXAMPLE 2

If output resolution: CT resolution is 1:2, then the CT pixel window corresponding to the second output pixel is obtained by displacing the CT pixel window corresponding to the first output pixel sideways by two CT pixels. Therefore, three of the five partial results used for the first output pixel may be reused when computing the second output pixel.

EXAMPLE 3

If output resolution: CT resolution is 2:1, then the CT pixel window corresponding to the second output pixel is sometimes exactly the same as the CT pixel window corresponding to the first output pixel. This is because the CT pixel window is determined by its central pixel, which is defined as the CT pixel covering the center of the output pixel.

Specifically, if the output resolution is twice the CT resolution, the output pixels are half as long as the CT pixels. Therefore, in half of the cases, the centers of adjacent output pixels are covered by the same CT pixel and therefore the convolution windows corresponding to those adjacent output pixels are identical. In these cases, all five partial results used for the first output pixel may be reused when computing the second adjacent output pixel. However, the five partial results for the second output pixel will respectively be multiplied by 5 column coefficients which are generally *not* equal to the column coefficients by which the partial results were multiplied in order to compute the first output pixel.

In the remaining half of the cases, the centers of adjacent output pixels are covered by adjacent CT pixels and therefore the convolution windows corresponding to those adjacent output pixels are displaced vis a vis one another by a single CT pixel. In these cases, four out of the five partial results used for the first output pixel may be reused when computing the second adjacent output pixel. As above, when the partial results ar reused for the second output pixel, they are multiplied by respective column coefficients which are generally not equal to the column coefficients used to compute the first output pixel.

Referring again to FIG. 10, a dual port buffer array 156 is provided which comprises a plurality of dual port buffers corresponding in number to the number, s, of separations of the color image (typically s=3 or 4, such as in RGB and CMYK color coordinate systems, respectively) The dual port buffer array 156 stores the m partial results for each of the s separations. The partial results are computed by the column convoluting unit which includes: multiplier array 152, adder tree 154, row coefficient table 160, and column ALU 158.

Column ALU 158 is operative to control the operation of the column convoluting unit in accordance with the position of the center of the current output pixel along the y axis of the CT representation of the color image, also termed "the y location" or Y. The integer part of Y addresses the rows of the row buffer 86 of FIG. 8, since the convolution window is centered on the CT pixel which "covers" the center of the current output pixel, as explained above.

The fraction part of Y addresses the row coefficient table 160. This is because the values of the row coefficients vary as a function of the y location of the center of the current output pixel *within* the corresponding CT pixel. For example, it is often desired to have the weight of each CT pixel vary monotonically as a function of the distance of that CT pixel from the center of the output pixel. In this case, if the center of the current output pixel falls very close to the top of the corresponding CT pixel, then the top rows of the convolution window receive more weight in determining the color value of the output pixel, relative to the bottom rows of the convolution window. In other words, the top row coefficients will generally be large relative to the bottom row coefficients.

The partial results stored in dual port buffer 156 are supplied to the row convoluting unit which is operative to perform the row convolutions and which comprises: array 162 of multipliers, adder tree 164, row ALU 166 and column coefficient table 168. Row ALU 166 is operative to control the operation of the row convoluting unit in accordance with the position of the center of the current output pixel along the x axis of the CT representation of the color image, also termed "the x location" or LX. The integer part of LX addresses pixels within the rows of the row buffer 86 of FIG. 5, since the convolution window is centered on the CT pixel which "covers" the center of the current output pixel, as explained above.

The fraction part of LX addresses the column coefficient table 168. This is because the values of the column coefficients vary as a function of the x location of the center of the current output pixel *within* the corresponding CT pixel, analogously to the variation of the row coefficients as a function of the y location of the center of the current output pixel within the corresponding CT pixel, as explained above.

As explained above, row ALU 166 computes the current CT column location. Column ALU 158 computes the current CT row location.

Finally, a limier 170 trims the result to within the range of the storage format, typically an 8-bit format.

It is noted that the row and the column convolutions are generally analogous operations and consequently, in the embodiment of FIG. 10, two generally identical row and column convoluting units, each comprising multipliers, adders, a coefficient table and an ALU, are coupled to one another to sequentially perform the two operations.

A particular advantage of the structure of FIG. 10 is as follows: In state of the art devices, it is generally the case that the column convolutions are sequentially computed and then stored for all pixels in the row being processed. Subsequently, the device returns to the beginning of the row and performs the row convolutions, typically employing only 3 to 5 of the stored column convolutions for each row convolution operation. In the device of FIG. 10, the row convolutions are performed "on the fly" relative to the column convolutions, rather than being performed only after an entire row has been convolved.

Therefore, only m column convolutions per separation need be stored in dual buffer array 156.

A further advantage of the embodiment of FIG. 10 is the provision of m buffers per separation, thereby enabling the convolutions for all separations (typically 3 or 4) of the color image to be performed on a single device comprising a single column convolution unit and a single row convolution unit, instead of three or four of each kind of unit.

A disadvantage of the embodiment of FIG. 10 is that, in cases in which the column convolution rate is not equal to the row convolution rate, only one of the row and column convolution units will be continuously operative at capacity, which is uneconomical.

Figure 11:
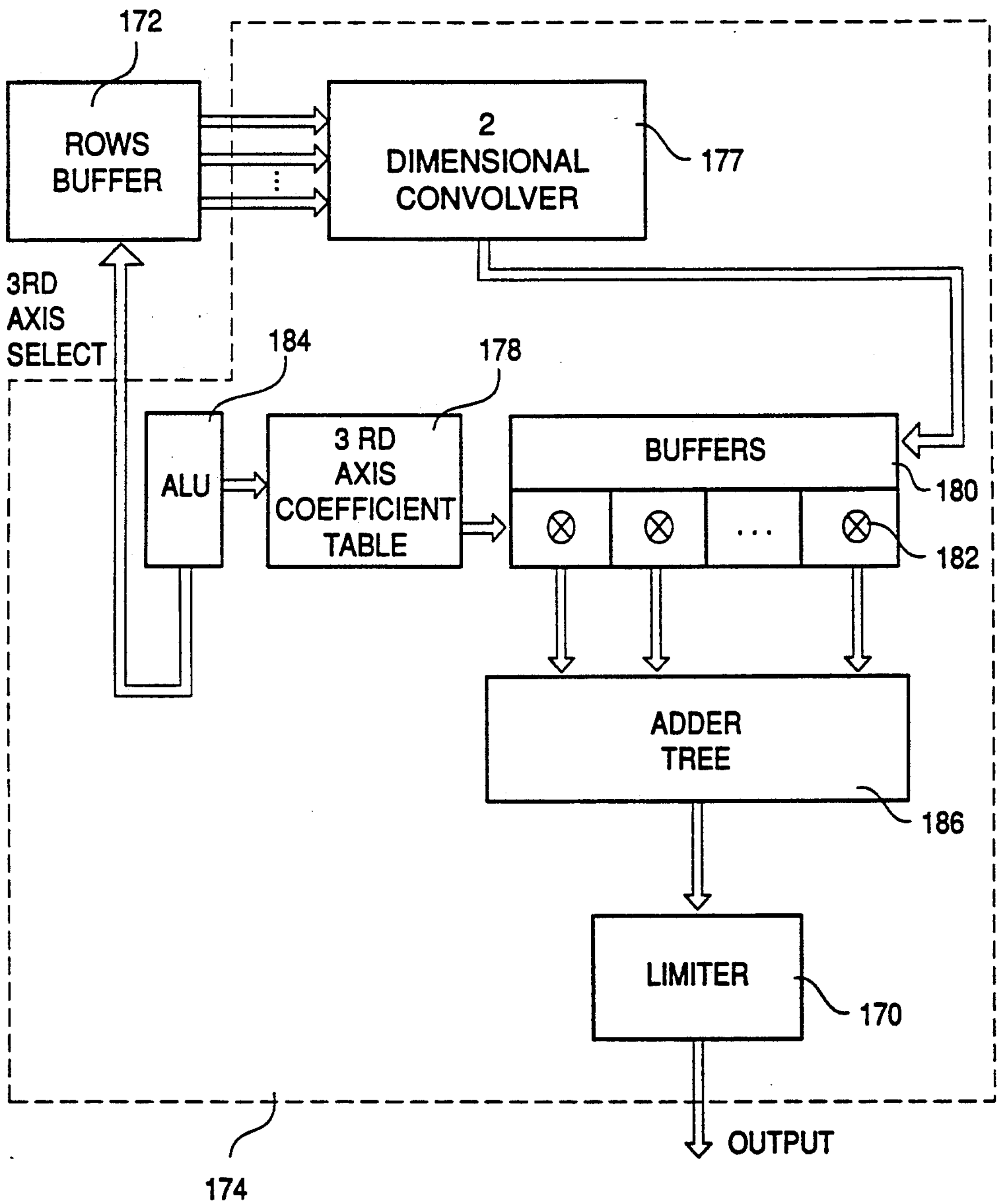
FIG. 11 is a block diagram of three dimensional convolution apparatus and illustrates how the structure of FIG. 10 may be extended analogously to process a color image of n-dimensions.

Reference is now made to FIG. 11 which is a block diagram of three dimensional convolution apparatus comprising a storage buffer 172 and a scaler 174. The storage buffer 172 and scaler 174 of FIG. 11 are respectively similar to the rows buffer 86 of FIG. 8 and the scaler 96 of FIG. 10. However, the apparatus of FIG. 11 is operative to process a 3 dimensional image, such as a 3 dimensional color image, rather than a 2 dimensional image. More generally, FIG. 11 illustrates how the structure of FIG. 10 may be extended analogously to process a color image of any number of dimensions.

As shown in FIG. 11, the three dimensional apparatus comprises a two dimensional convolver 17, which may be similar to the scaler 96 of FIG. 10 except that the limiter 170 of FIG. 10 is omitted, a coefficient table 178 for the coefficients of the third dimension, an array of dual port buffers 180 which may be substantially identical to dual port buffer array 156 of FIG. 10, an array of multipliers 182 which may be substantially identical to multiplier arrays 152 and 162 of FIG. 10, an ALU 184 which may be substantially identical to ALUs 158 and 166 of FIG. 10, and an array of adders 186 which may be substantially identical to the adders 154 and 164 of FIG. 10.

In certain applications, it may be desired to add a limiter after the adder of each dimension. In the above example, a limiter may be added between 2 dimensional convolver 177 and buffer array 180. The additional limiter per dimension is operative to restrict the result to a suitable accuracy.

Control ALU 184 is operative to address coefficient table 178 and to select a position along the third axis and provide an indication of the selected position to rows buffer 172.

Rows buffer 172 comprises a plurality of row buffer arrays, numbering at least five (assuming that the dimensions of the convolution window are 5×5×5) row buffer arrays, each of which may be identical to rows buffer 86 of FIG. 8.

If it is desired to add a plurality of dimensions to the apparatus of FIG. 10, it is appreciated that the modification of FIG. 10 to obtain FIG. 11, as described above, may be repeated a plurality of times, thereby adding one dimension to the convolution apparatus per repetition.

Figure 12:
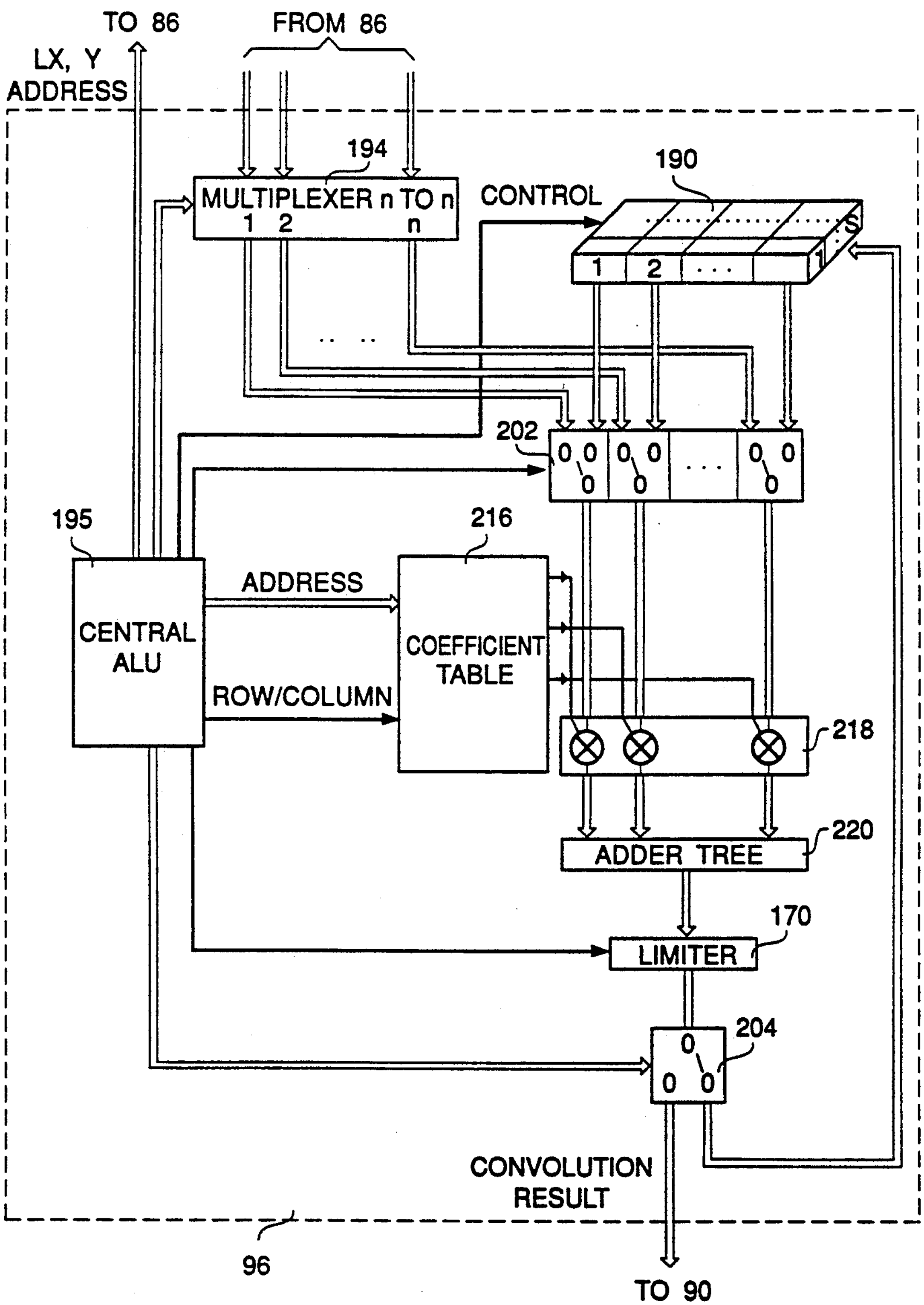
FIG. 12 is a block diagram of a second preferred hardware implementation of convolution scaler 96 of FIG. 8.

Reference is now made to FIG. 12, which illustrates a second preferred hardware implementation of scaler 96 of FIG. 8, comprising a modification of the apparatus of FIG. 10 which has the advantage of not requiring that a separate convolution unit, comprising buffer, multipliers, coefficient table, adders and ALU, be provided per dimension of the image to be processed. Instead, a single unit processes all dimensions of the image.

FIG. 12 generally resembles the embodiment of FIG. 10 except for the following two differences: First, the dual port buffer array 156 of FIG. 10 is replaced by a SIPO (serial in parallel out) shift register array 190. Second, an input multiplexer 194 is provided which provides cyclic permutations of the rows stored in rows buffer 86 of FIG. 8, thereby eliminating the need to rearrange either the row order in the buffer or the order in which the coefficients from the coefficient table are supplied, for each convolution process.

The apparatus also comprises a central ALU 195, a selector array 202 comprising n selectors, each controlled by the central ALU 195 and each having a column convolution position and a row convolution position; and a selector 204 controlled by the central ALU 195 and having a column convolution position and a row convolution position.

A preferred mode of operation of the apparatus of FIG. 12 will now be described. CT image data from five rows of the CT image arrive from row buffer 86 of FIG. 8 and is provided, via multiplexer 194 and selector array 202, to multipliers 218. Multiplexer 194 is operative to supply the appropriate rows in the appropriate order for the convolution window, by applying a suitable cyclic permutation to the output of row buffer 86 and by duplicating some of the rows of row buffer 86 as necessary, in the vicinity of the edges of the CT image.

Selectors 202 are in their column convolution position (as shown), namely, they are operative to select the inputs arriving from the multiplexer 194 rather than "partial results" inputs arriving from SIPO array 190.

The five partial results are sequentially computed by multipliers 218 and full adder 220, using coefficients from coefficient table 216, and are trimmed by limiter 170. Selector 204 is in its column convolution position (as shown), namely it provides the information arriving from limiter 170 to the serial port of the SIPO array 190 rather than to selector 90 of FIG. 8.

When the five current partial results are present in SIPO array 190, they are simultaneously provided, at a suitable time as indicated by central ALU 195, to selector 202. Selector 202 is now in its row convolution position and therefore receives input from SIPO 190 rather than from multiplexer 194. The five partial results used to perform row convolution are operated upon by multipliers 218 and full adder 220, using coefficients from coefficient table 216, and the result is trimmed by limier 170. Selector 204 is in its row convolution position, namely it provides the information arriving from limiter 170 to the selector 90 of FIG. 8, rather than to the serial port of the SIPO array 190.

Central ALU 195 is also operative to restore selectors 202 and 204 to their column convolution position, to change the position of multiplexer 194 and to extract new row information from rows buffer 86 of FIG. 8, thereby to allow another convolution cycle to begin.

In accordance with a preferred embodiment of the apparatus, the input to the apparatus of FIG. 12 does not include the validity bit information coded by coder 84 of FIG. 8. The validity bit is typically provided to the scaler 98 of FIGS. 8 and 18.

Central ALU 195 may be implemented using any suitable commercially available components, such as WS59032, commercially available from Wafer Scale, Fermont, Calif., USA. Preferably, the components should be chosen such that a suitable level of computation accuracy is maintained and such that the accumulated location error is negligible.

It is appreciated that multipliers 218 and adders 220, which are typically the most costly components of the apparatus, are fully utilized, i.e. are generally never idle, thereby reducing the cost to performance ratio of the apparatus.

Coefficient table 216 contains as much information as do both coefficient tables 160 and 168 of FIG. 10, since it contains the coefficients to be used for both the column and the row convolutions. Coefficient table 216 may be implemented using any suitable commercially available high speed memory, preferably with a capacity of at least two pluralities (corresponding to the x and y directions) of 8 ($=2^3$) by 5 words (assuming that the dimension of the convolution matrix is $5\times5$) of 12 bits each.

Coefficient table 216 is typically addressed by a 3 bit word provided by central ALU 195, and also by a one bit signal, also provided by central ALU 195, which indicates whether the row or the column coefficients are to be accessed. The address is determined by the fraction part of the location along the x axis, for row convolution, or along the y axis, for column convolution. Each address refers to a plurality of n words, typically 12 bits in width, which are output to the n multipliers in multiplier array 218. The number of bits in the address determines the accuracy of selection of the convolution coefficients.

The multiplier array 218 comprises a plurality of n multipliers, each preferably based upon commercially available integrated circuits such as the TRW2010, commercially available from TRW. The multiplier array receives 8 bit input from the multiplexer 194 via the selector 202, and also receives 12 bit input from the coefficient RAM 216. Typically, only 12 bits from the output of the multiplier array are utilized.

Referring back to FIG. 12, the limiter 170 preferably receives a bit of information from central ALU 195 indicating whether the apparatus is in its first, column convolution, stage of operation or in its second, row convolution stage of operation. This is because the range of the multiplier 218 is typically 12 bits, so that it is unnecessary for the limiter to trim to the output range value, which is typically 8 bits, unless the apparatus has completed its second, column stage of operation. Otherwise, it is sufficient to trim to 12 bits.

SIPO array 190, multiplexer array 194, adder tree 220 and selector 202 are described in detail hereinbelow, with reference to FIGS. 16–17, 19–20, 14 and 15, respectively.

It is appreciated that the provision of a SIPO shift register array 190 has at least two important advantages, relative to a conventional row buffer such as the dual port buffer array 156 of FIG. 10.

a. A particular feature of the apparatus of FIG. 12 is that the convolution cycles are generally continuous, in other words, it is generally not necessary to provide a delay between "adjacent" column convolution cycles or between "adjacent" row convolution cycles. The term "adjacent" refers to an operation which follows another operation. For example, if the CT:output resolution ratio is less than 1, two row convolution operations are sometimes performed one after the other on the same set of partial results (column convolutions), because the CT pixels are larger than the output pixels.

As a result, substantially all components of FIG. 12 of the circuit are normally operative and not idle. Nonetheless, partial results which are still needed are preferably never overwritten by newly computer partial results. The term "overwriting" intended to refer to destruction or deletion of old data in a full storage device due to arrival of new data. This advantage is achieved by the particular structure of the SIPO shift register array, described below with reference to FIGS. 16 and 17.

For example: if the resolution is being increased threefold, i.e. if the output resolution: CT resolution ratio is 3:1, three convolution operations are performed on the same five columns of CT pixels, corresponding to the three output pixels "superimposed" upon the central pixel of the middle column of CT pixels. Each convolution comprises the process of adding 5 column convolutions stored in SIPO 190, each weighted by an appropriate column coefficient arriving from coefficient table 216. Typically, the tree sets of column coefficients used respectively for the three convolution operations differ, since the centers of the three respective output pixels occupy different positions along the y axis, as explained above.

After the three convolution operations have been performed, the convolution window is "translated" forward a distance along the color image corresponding to the length of a single CT pixel, which, in the present example, corresponds to the length of three output pixels. Each of the 5 column convolutions (partial results) moves over one place in the SIPO shift register array 190 and the first computer column convolution is dropped from the shift register 242 of FIG. 17, being replaced by a newly computer column convolution at the other end of the SIPO shift register array 242. The convolution apparatus of FIG. 12 shifts from performing column convolutions to performing a row convolution. This advantage may be better understood with reference to the discussion of FIG. 13 below.

b. The order in which the partial results (column convolutions) are stored in the SIPO shift register array 190 corresponds to the order of the row convolution coefficients in the coefficient table 216.

For applications in which the data to be convolved comprises a representation of a color image having a plurality of separations, the convolution window is preferably translated only after all necessary operations have been carried out on all the separations, for the present convolution window.

For certain input:output data resolution ratios (the input resolution is also termed herein "CT resolution") and/or for certain relative alignments of the CT image data and the output image and/or in applications in which the data to be convolved comprises a representation of a color image having a plurality of separations, a fixed pipeline delay is required between switch 204 and SIPO array 190 in order to prevent a situation in which a row convolution operation would "overlap" a column convolution operation or vice versa, in other words, to prevent a situation whereby resources are simultaneously required for row convolution operations and for column convolution operations. The "overlap" problem may arise, for example, due to the uneven "pace" of at least one of the row and column convolutions. In other words, the number of partial results which are computer for a particular output pixel and are then reused for an adjacent output pixel may vary over output pixels as a result of the CT:output resolution ratio and/or the relative alignments of the CT image and the output image.

The pipeline delay may be implemented by adding at least one pipeline segment or cell between limiter 204 and SIPO array 190 and/or by adding at least one cell to each SIPO 240 of the SIPO array 190. The length of the pipeline delay is preferably fixed for the entire body of data.

Figure 13:
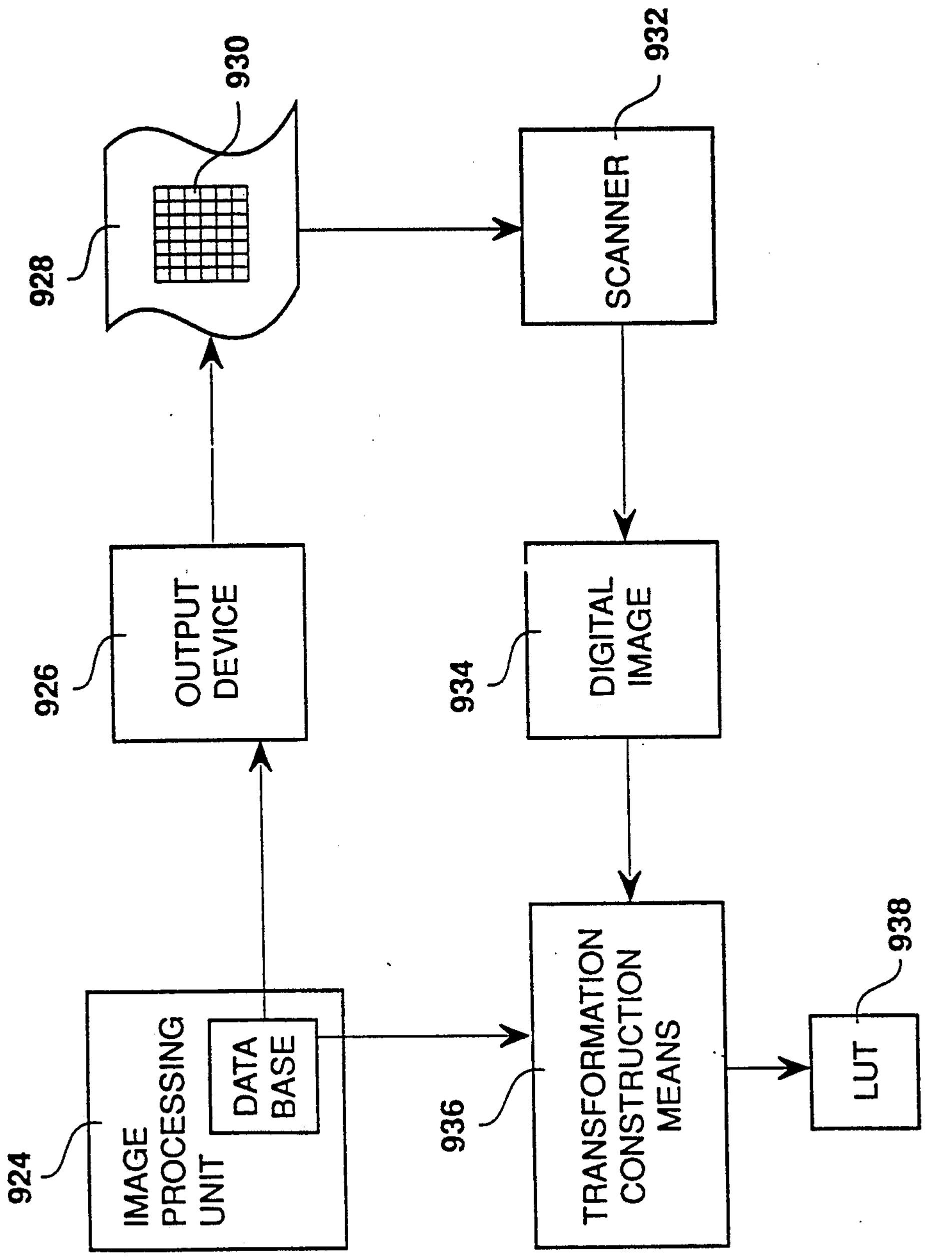
FIG. 13 illustrates in table form a sample flow of data through the components of convolution scaler 96 of FIG. 12.
Figure 14:
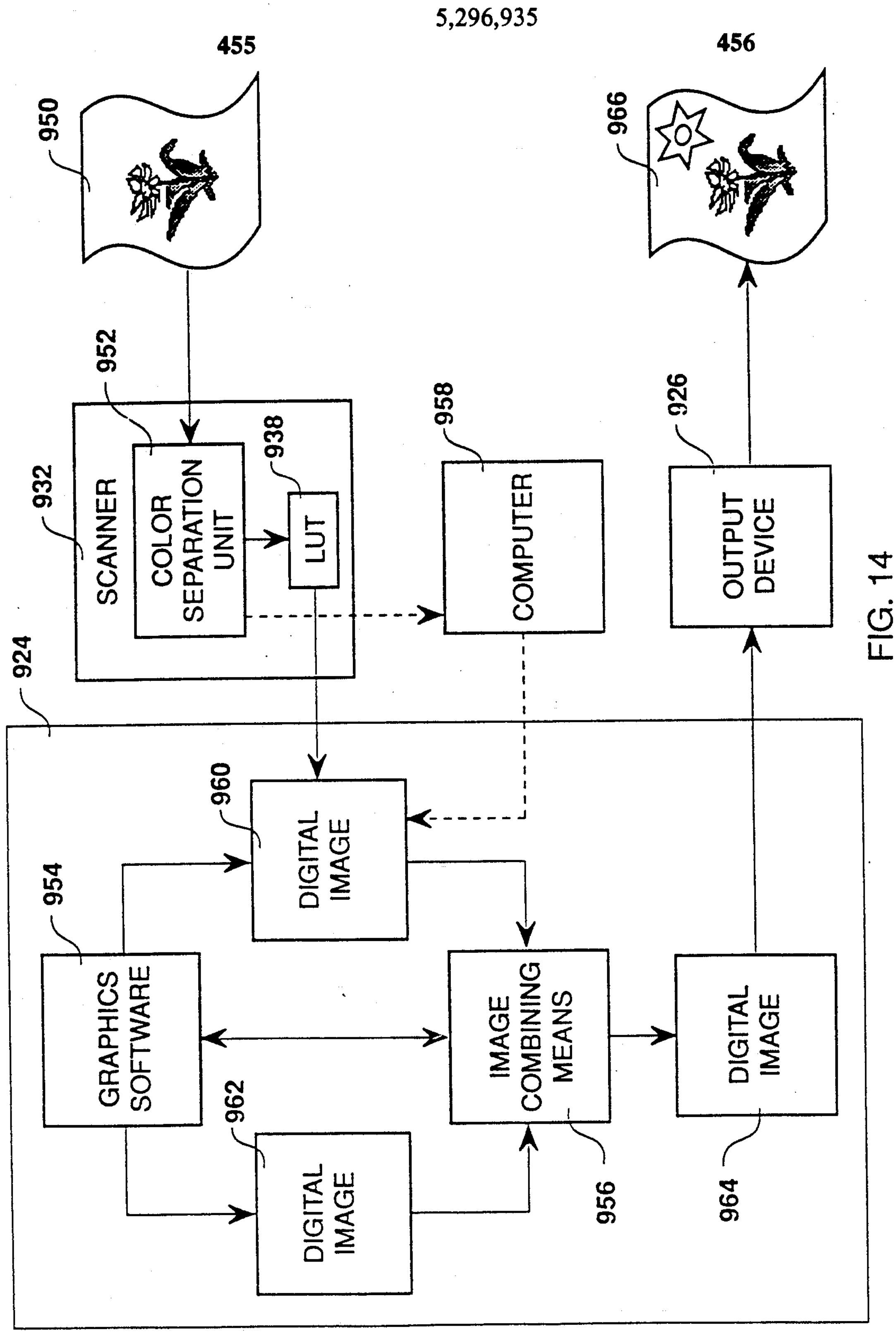

Reference is now made to FIG. 13 which illustrates in table form a sample flow of data through the components of the convolution scaler of FIG. 12. In the illustrated example, the ratio of CT resolution to output resolution is 2.5:1, the number of separation is 1, and a $5\times5$ convolution window is employed.

Pipeline segments within FIG. 12, which each delay data for one clock period, appear in the left hand column. They are: multiplier array 218; segments 1, 2 and 3 of the adder tree 220 (see FIG. 14); and cells 1 to 5 of the shift register array 190. The bottom row of FIG. 12 indicates the clock cycles. The top row of the heading indicates the value of a parameter LX, which parameter is discussed below. The bottom row of the heading indicates the value of a parameter X at each clock, the significance of which parameter is also explained below.

The natural numbers 1, 2, 3, . . . within the table represent the 5 pixels or other units of data arriving from the five respective adjacent rows stored in rows buffer 86. The first arriving group of five pixels or data units is referenced 1. Group 2 of five pixels arrives after group 1, etc.

$R_0$ represents a delay or a "blank" pipeline segment. $R_i$, for all positive i, represents a pipeline segment which is utilized for a row convolution operation rather than for a column convolution operation. In general, row convolution is initiated after a time slot is provided at the last segment of the adder tree. For example, in clock 7, a time slot is provided at the last segment of the adder tree. This may be seen in FIG. 13, where the location of the table corresponding to segment 3 of the adder tree and to clock 7 is marked $R_0$. In the following clock period, clock 8, the first row convolution is initiated on the contents of the shift register, namely the five partial results of rows 1, 1, 1, 2 and 3. This requires that the multipliers 218 and subsequently, the adder tree 220, operate upon the partial results rather than on new data, and this is the reason why the time slot $R_1$ is provided.

As noted above, $R_1$ is performed on the partial results or column convolutions corresponding to pixel groups 1, 1, 1, 2 and 3, which are combined within the shift register at clock 7. $R_2$ is performed on the partial results corresponding to pixel groups 1–5, which are combined within the shift register at clock 10. $R_3$ is performed on the partial results corresponding to pixel groups 4–8, which are combined within the shift register at clock 14, and so on.

The flow of data for the first convolution operation, defining the first output pixel, will now be described with reference to the table: on the first clock, group 1 of five pixels from five adjacent rows arrives via rows buffer 86, multiplexer 194 and selector 202 to multiplier array 218 where each pixel is multiplied by a row coefficient from coefficient table 216.

On the second clock, group 2 of five pixels arrives at multiplier array 218 and group 1 continues to the first segment of the adder tree 220. On the third clock, group 3 of five pixels arrives at multiplier array 218 and groups 2 and 1 are in segments one and two of the adder tree 220 respectively.

On the fourth to seventh clocks, the multiplier array 218 and the three segments of the adder tree are respectively "blank". It is noted that blank segments only occur prior to the first row convolution operation. For all subsequent row convolution operations i ($i>0$), the segments corresponding to the above blank segments are utilized for the operations pertaining to row convolution $i-1$.

On the eighth clock, the multiplication step of row convolution $R_1$ occurs in the multiplier array 218. Row convolution 1 is "incomplete" in the sense that only three distinct rows, rather than five distinct rows, participate in the convolution.

On clocks 9 to 11, the five products (column convolution x column coefficient) are added. Therefore, the first convolution result is completed at clock 11.

The second convolution operations are initiated on clock 5 and the second convolution result is completed at clock 14. The flow of operation for the second convolution is generally the same as for the first convolution, except that some of the partial results computed for the first convolution remain in the shift register and are reused for the second convolution. In the present example, the reused partial results are those corresponding to pixel groups 1, 2 and 3.

Reference is now made to the second row of the heading of FIG. 13, referenced X, which indicates the value of a parameter X computed by ALU 195 and useful in controlling and sequencing the convolution operations within a given row. As seen, row convolution is initiated on clocks for which the value of X is less than 1. On those clocks, the value of X is incremented by x, which is the ratio of CT resolution to output resolution along the horizontal axis. In the present example, $x=2.5$. On all other clocks, the value of X is reduced by 1.

Preferably, central ALU 195 also computes a parameter LX. The integer part of LX indicates the middle column of the convolution window, i.e. the column within which the central convolution pixel resides. LX is incremented by one on every clock for which $X>=1$.

X is also useful in selecting column coefficients for row convolution operations. Specifically, the fractional part of X is used by ALU 195 to access the coefficient table 216.

It is noted that a parameter Y is also employed by central ALU 195 for controlling the convolution operations between rows. The integer part of Y indicates the middle row of the convolution window, i.e. the row within which the central convolution pixel resides. Therefore, Y remains constant throughout the processing of any particular row. At the end of each row, Y is incremented by y, which is the ratio of CT resolution to output resolution along the vertical axis.

Y is also useful in selecting row coefficients for column convolution operations. Specifically, the fractional part of Y is used by ALU 195 to access the coefficient table 216.

Figure 14:
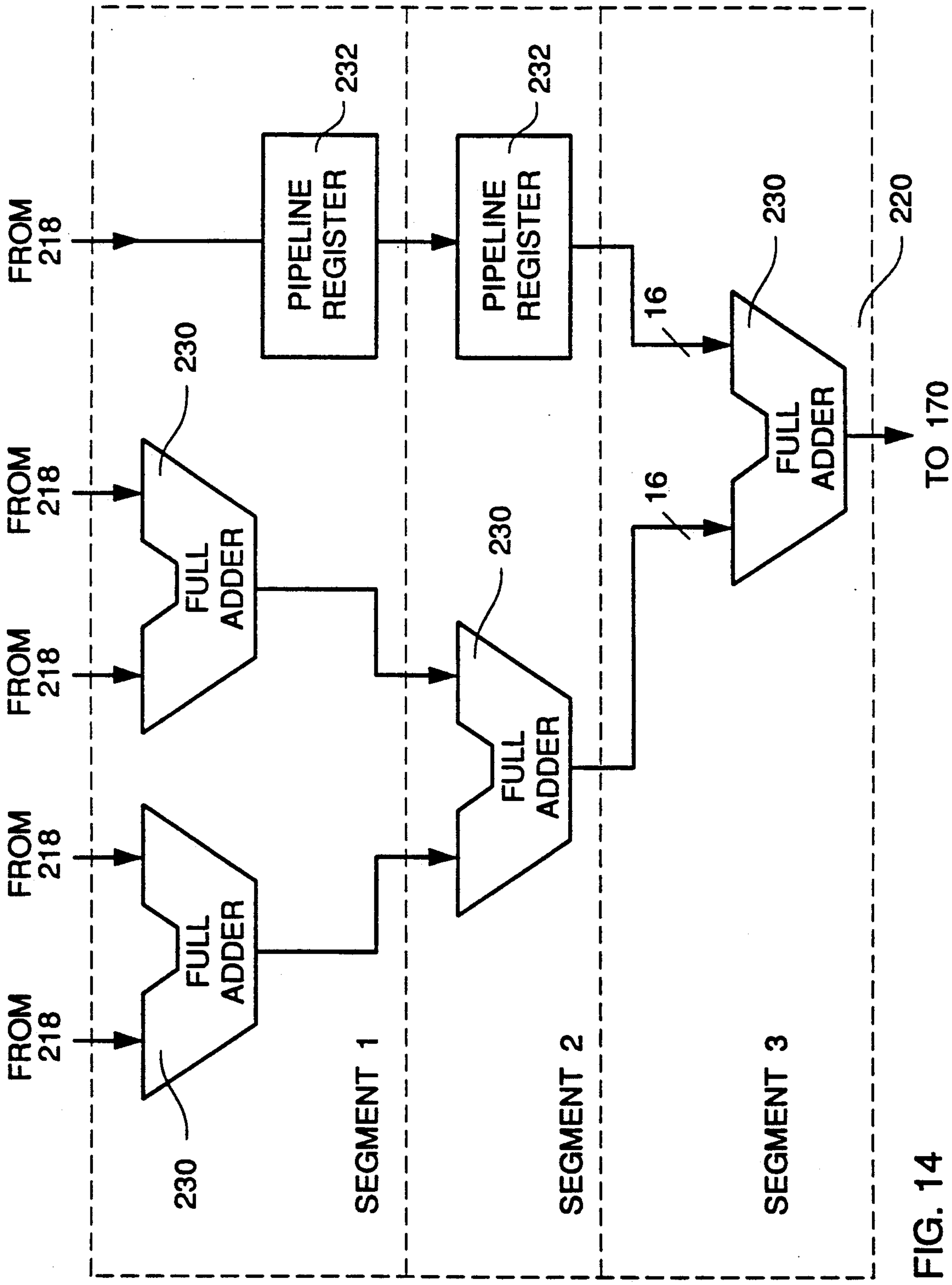
FIG. 14 illustrates adder tree 220 of FIG. 12 constructed and operative in accordance with a preferred embodiment of the present invention.

Reference is now made to FIG. 14, which illustrates the full adder tree 220 of FIG. 10, constructed and operative in accordance with a preferred embodiment of the present invention. As seen in FIG. 14, the full adder tree comprises a plurality of full adders based on commercially available integrated circuit full adders, such as the 74F283 commercially available from Philips, Eindhoven, Netherlands. In the present embodiment, the FIG. 14 full adder tree adds m=5 streams of input data.

Since 5 falls between the second and third powers of 2, a three-segmented full adder tree is provided, comprising four full adder trees. Suitable pipeline register elements 232 provide delays which "fill in" the full adder tree. The first segment adds two pairs of input data elements and provides the two sums to the full adder of the second segment, which adds them and provides the sum of the two sums to the full adder of the third segment. The fifth data element is delayed by the pipeline register elements 232 and is added to the sum of the two sums by the full adder of the third segment.

Analogous full adder trees can be constructed for other suitable values of m.

Figure 15:
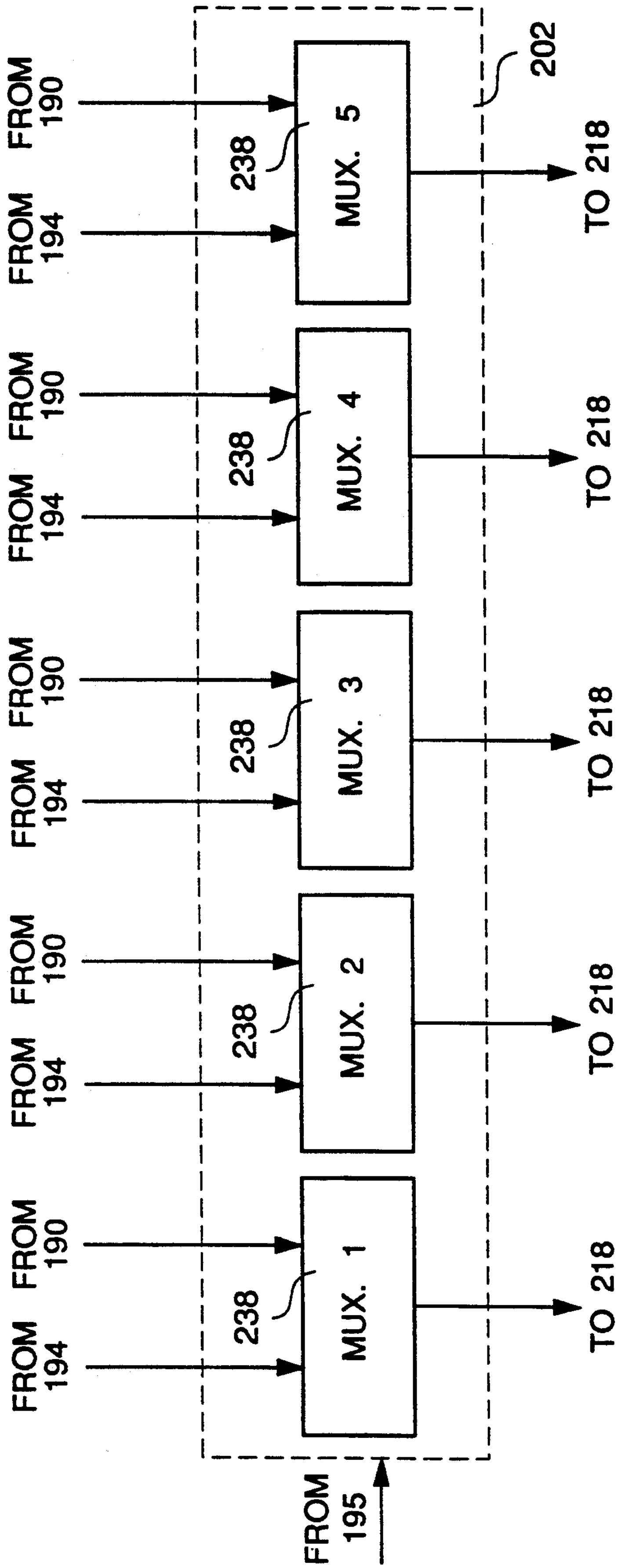
FIG. 15 is a block diagram of selector 202 of FIG. 12 constructed and operative in accordance with a preferred embodiment of the invention.

Reference is now made to FIG. 15 which is a block diagram of selector 202 of FIG. 12, constructed and operative in accordance with a preferred embodiment of the present invention.

The selector 202 is operative to select between a first plurality of m streams of data arriving from multiplexer array 194 of FIG. 12 and a second plurality of m streams of data arriving from SIPO array 190. Selector 202 comprises an array of m multiplexers 238, each typically receiving an 8 bit stream of data form multiplexer array 194 and a 13 bit stream of data from SIPO array 190. In the illustrated embodiment, m=5, however, an analogous device may be constructed for any other suitable value of m. Multiplexers 238 may be commercially available integrated circuit multiplexers, such as the 74F157, commercially available from Philips.

Each multiplexer 238 typically selects one of the two inputs thereto and provides the selected signal as an output signal to multipliers 218 in accordance with a "select" signal provided by the sequencer 195 of FIG. 12. Since the second plurality of inputs arrives at multiplexer array 202 in 8 bits, the 8 bits are typically the LSB's and the remaining 6 bits of the multiplexer's inputs are grounded.

Figure 16:
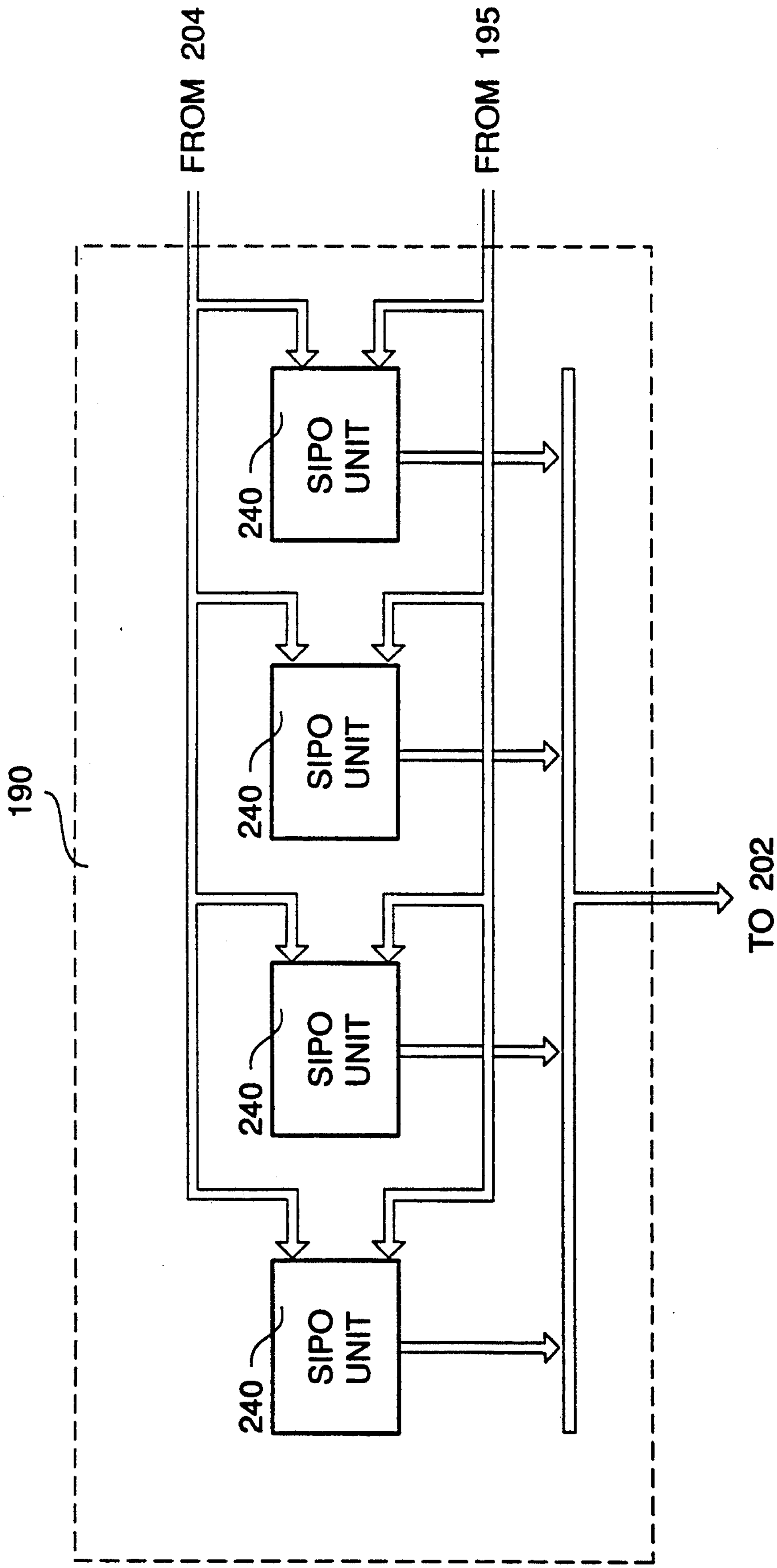
FIG. 16 is a block diagram of SIPO 190 of FIG. 12 constructed and operative in accordance with a preferred embodiment of the present invention.

Reference is now made to FIG. 16 which is the block diagram of SIPO array 190 of FIG. 12. The SIPO array 190 is operative to process s=4 separations or less and preferably comprises 4 identical SIPO units 240 interconnected as shown.

Each SIPO unit 240 has an "output enable" channel controlled by central ALU 195. The SIPO unit 240 which receives a signal over the output enable channel is the unit which provides an output to selector 202.

Figure 17:
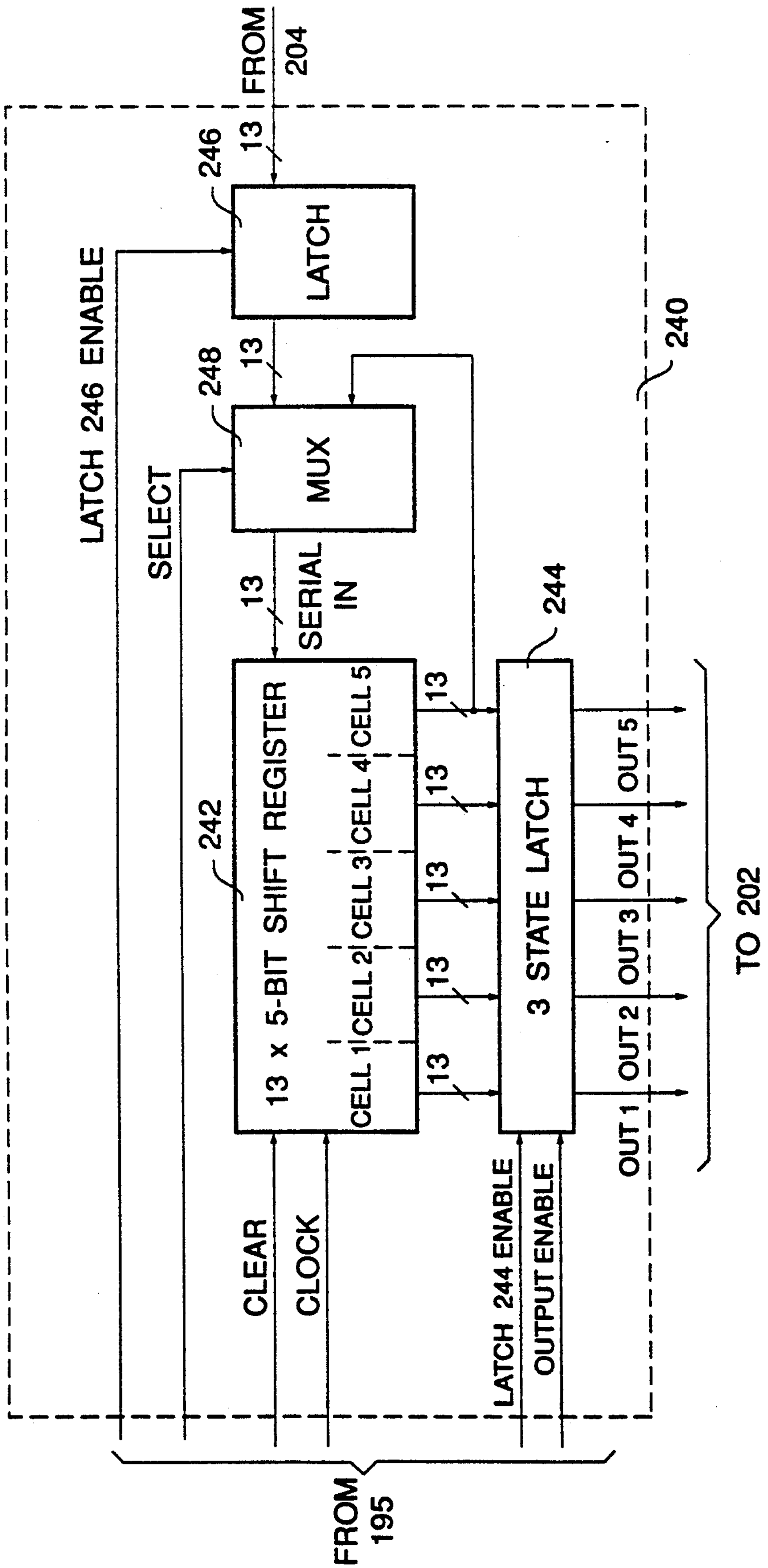
FIG. 17 is a block diagram of an individual one of SIPO unit 240 of FIG. 16 constructed and operative in accordance with a preferred embodiment of the present invention.

Reference is made to FIG. 17 which is a block diagram of an individual one of SIPO units 240 of FIG. 16. The SIPO unit 240 comprises a 5 stage shift register 242 having a width of 13 bits. The SIPO unit also comprises a 3 stage latch 244 between shift register 242 and selector 202 of FIG. 12. The latch 244 is operative to receive the output enable signal from central ALU 195. The latch 244 also receives a latch enable signal from central ALU 195 which enables the latch 244 to synchronize the outcoming signal from shift register 242 in relation to the other elements of convolution scaler 96 of FIG. 12, thereby to prevent premature overwriting of partial results data or pixel data.

The partial results which are loaded into the 13 bit wide serial input port of the shift register 242 arrive from selector 204 of FIG. 12 via a latch 246 and a multiplexer 248. The latch 246 is operative to receive a latch enable signal from central ALU 195 which enables the latch 246 to synchronize the incoming signal from selector 204 so as to prevent overwriting of stored data in shift register 242 until such data is no longer needed. The latch enable signal also results in the last column of the color image being stored in latch 246. The last column may thereby be provided in duplicate or triplicate to shift register 242. The duplication or triplication of column data within shift register 242 is intended to "fill in" the convolution window when the central column of the convolution window is too close to the edge of the color image.

The multiplexer 248 is operative to deal with data pertaining to the first few columns of the color image. The multiplexer receives a select signal from central ALU 195. The select signal indicates whether the multiplexer should supply the data in latch 246 to shift register 242, or whether the data most recently provided to shift register 242 should be duplicated therewithin. An analogous implantation may be employed to deal with data pertaining to the last few columns of the color image.

It is appreciated that central ALU 195 typically provides four of each of the following signals indicated in FIG. 17, one for each of the four SIPO units 240: latch 244 enable, output enable, latch 246 enable, and select.

Figure 18:
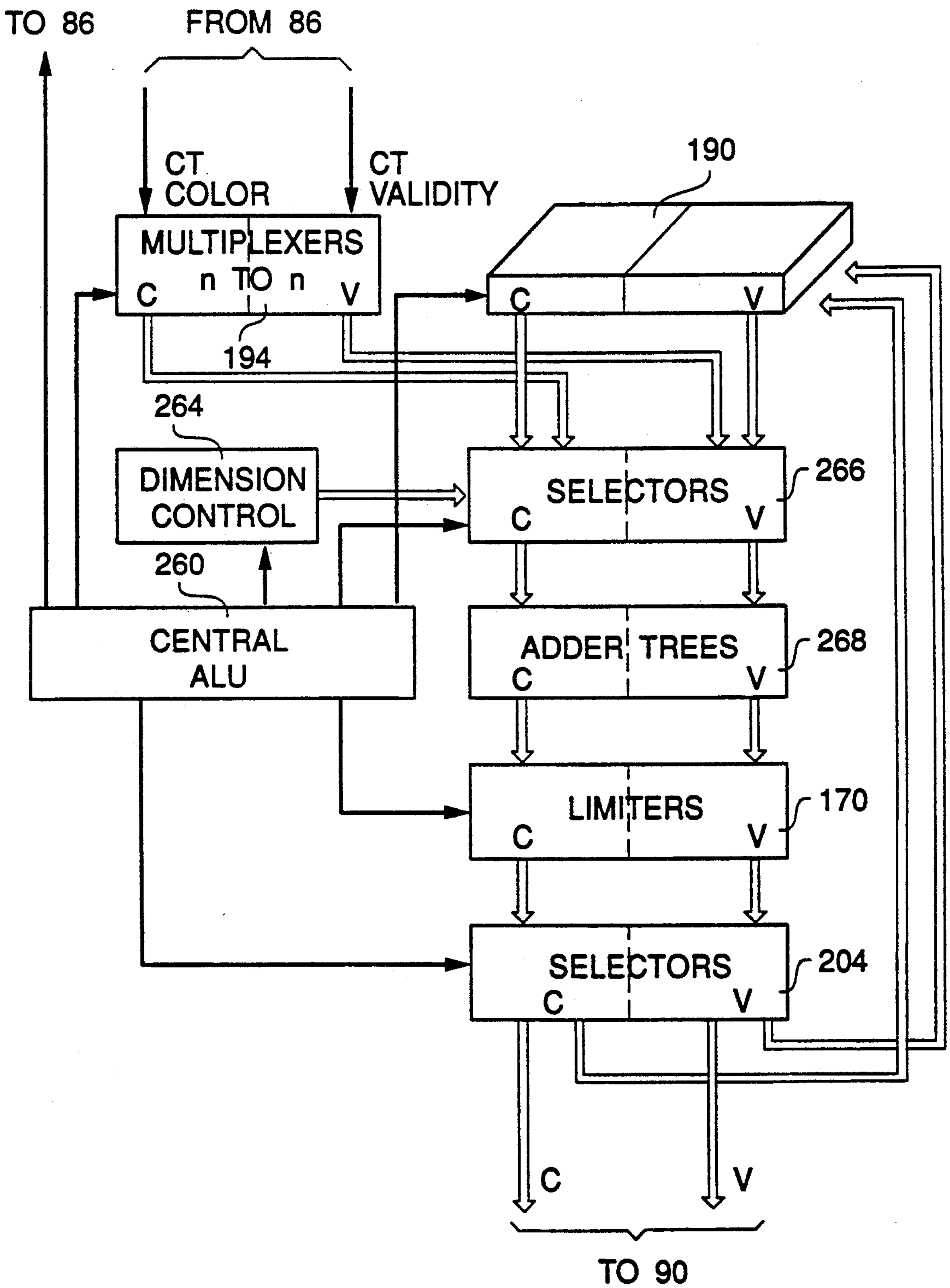
FIG. 18 is a block diagram of an averaging apparatus which is a preferred hardware implementation of validity decoder 88 and the averaging scaler 98 of FIG. 8.

Reference is now made to FIG. 18, which is a block diagram of averaging apparatus which is a preferred hardware implementation of the validity decoder 88 and the averaging scaler 98 of FIG. 8. It is appreciated that the apparatus of FIG. 18 is similar in many respects to the convolution scaler 96 of FIG. 12. Similar elements in FIGS. 12 and 18 are identically numbered. However, the elements of FIG. 18 differ generally from the identically numbered elements of FIG. 12 in the following ways:

(a) Each element of FIG. 18 typically comprises two of the corresponding identically numbered element in FIG. 12.

(b) The elements of FIG. 18 may process a different number of bits, relative to the corresponding elements of FIG. 12.

The apparatus of FIG. 18 receives two inputs pertaining to the current CT pixel from rows buffer 86 of FIG. 8: the "validity bit", described above with reference to FIG. 8, to be termed herein the "V stream" of data, and the color value of the CT pixel, to be termed herein the "C stream of data". The output of the apparatus of FIG. 18, comprising V stream output and C stream output, is provided to selector 90 of FIG. 8. AS explained above with reference to FIG. 8, the selector 90 employs the V stream in order to determine whether the output of scaler 96 or of scaler 98 will be selected. If the V stream output is 1 for all CT pixels in the convolution window, the CT data can be convolved and therefore the output of convolution scaler 96 is used. Otherwise, the output of averaging scaler 98 or the output of LUT averager 92 and LUT 100 or a combination of the two outputs, as explained above with reference to FIG. 8, is used.

Only valid CT pixels are summed by averaging scaler 98. Both the C data stream and the V data stream are summed. Since invalid CT pixels are not summed, the sum of the validity bits of the CT pixels at least partially overlapping each output pixel is exactly equal to the number of pixels which have been summed by scaler 98 to provide a color value for that output pixel. Therefore, the selector 90 divides the sum of the valid CT pixel color values computed by scaler 98 by the sum of validity bits (provided by the V stream), to obtain the "averaging" color value for the output pixel.

The apparatus of FIG. 18 comprises multiplexer 194, SIPO array 190, a central ALU 260, a dimension control unit 264, a selector array 266, an adder tree array 268, a limiter 170, a selector array 204.

Generally, the apparatus of FIG. 18 is constructed and operative similarly to the apparatus of FIG. 12, and therefore the discussion of various aspects of the apparatus of FIG. 12, such as pipeline delay, treatment of the edges of the image and overwriting issues is not repeated here. However, the following differences between the apparatus of FIG. 18 and the apparatus of FIG. 12 are noted:

All elements process the C and V streams in parallel.

Coefficient table 216 of FIG. 12 is replaced by dimension control unit 264, which limits the area of the color image used in the summing computation from the maximum allowed by the constraints of the hardware to the smaller area required for averaging.

Each multiplier 218 of FIG. 12 is replaced by a corresponding element of selector array 266, typically comprising one "and" gate per bit. Selector array 266 is operative to select only valid CT pixels for summing.

The adder tree unit 268 of FIG. 18 comprises two adder trees handling the V stream and the C stream respectively. Each adder tree may be implemented similarly to the adder tree illustrated in FIG. 14 hereinabove, except for the following differences: In the C stream tree, all inputs to all four adders carry 9 bits. In the V stream tree, all inputs to the two adders of segment 1 carry 3 bits. The outputs of the two adders of segment 1 are 4 bits and the output of the adder of segment 2 is 5 bits. The output of the V stream adder tree (the output of the adder of the third segment) is also 5 bits.

Figure 19:
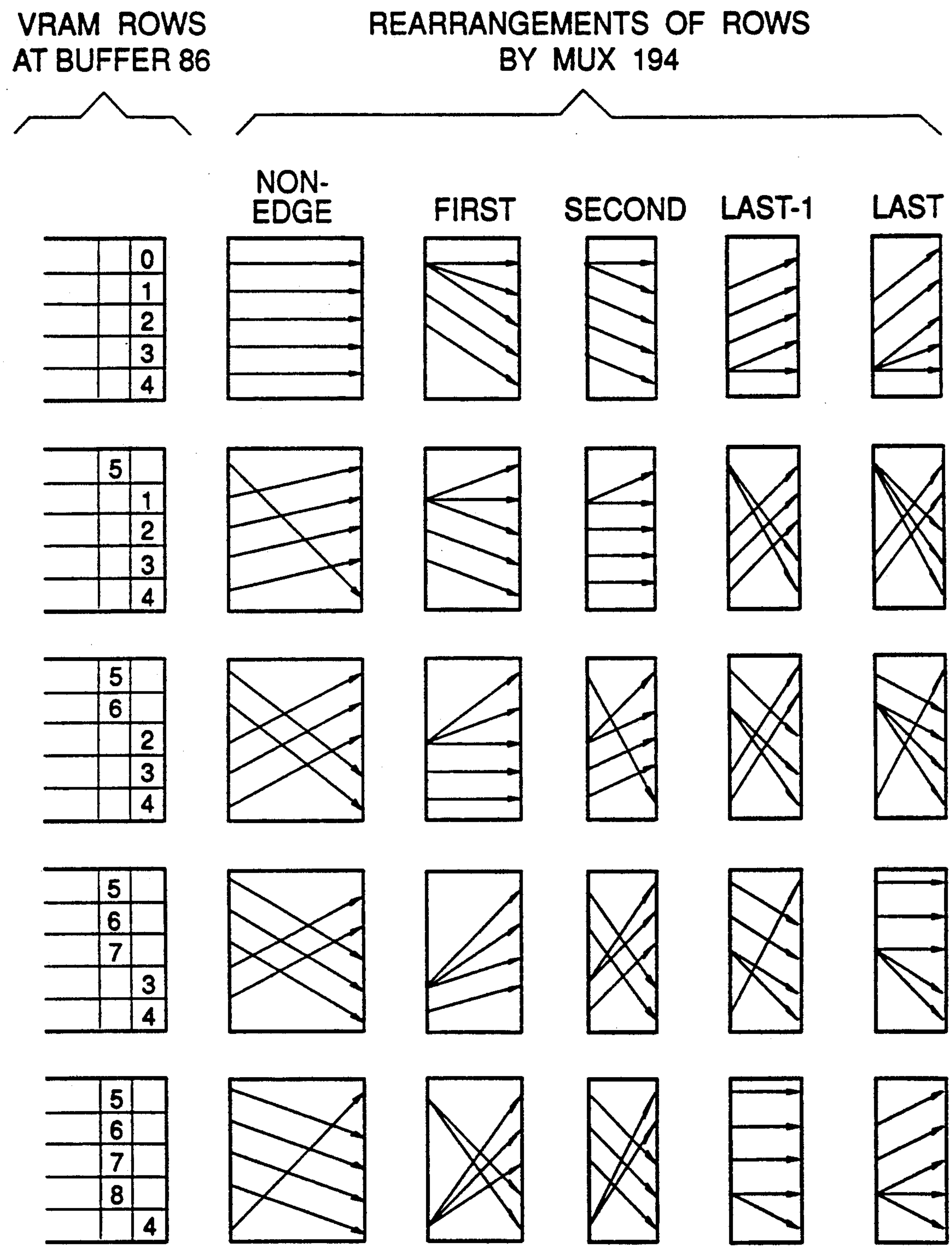
FIG. 19 conceptually illustrates aspects of operation of multiplexer 194 of FIGS. 12 and 18 in conjunction with the VRAMS rows buffer 86 of FIG. 8.

Reference is now made to FIG. 19 which conceptually illustrates aspects of the operation of multiplexer 194 of FIGS. 12 and 18 in conjunction with the VRAM rows buffer 86 of FIG. 8. As explained above, a particular feature of input multiplexer 194 is that it provides cyclic permutation of the rows stored in rows buffer 86 of FIG. 8, thereby causing the row order of the rows arriving from rows buffer 86 to continually correspond to the order of the coefficients in coefficient table 216 of FIG. 12. Therefore, there is no need to rearrange either the row order in the buffer or the coefficient table, between convolution processes.

It is appreciated that the structure of the multiplexer 194 and of the rows buffer 86 may be useful in many other applications other than convolution applications, which also require that streams of data having a particular order be sequentially arranged in a sequence of cyclic permutations of that order. Also, the present discussion pertains, for the purpose of illustration, to 5×5 convolution. However, the principles described here are relevant to convolution of any dimension.

According to a preferred embodiment of the present invention, the multiplexer 194 is also operative to deal with edge effects. Specifically, at the periphery of the page or color image, the data is not sufficient to define a convolution window. To solve this problem along the horizontal boundaries of the page, the multiplexer 194 employs and existing data row to replace non-existent data rows. To solve the analogous problem along the vertical boundary of the page, a plurality of cells of shift register 190 are filled in parallel with a single existing pixel value.

For example, if the current pixel is in the first column of the second row of the image, the multiplexer 194 may channel data row 1 to the data streams corresponding to the first and second rows of the convolution window. Data rows 2 to 4 may be channeled to the data streams corresponding to rows 3–5 of the convolution window. Within each of the rows, the first three cells of the shift register 190 are each filled with the color value of the first pixel of the row, as explained above with reference to FIG. 17. The fourth and fifth cells are filled with the color value of the second and third pixels of the row, respectively.

The rows buffer 86 preferably comprises a plurality of virtual "first in first out" storage units corresponding in number to the number of rows in the convolution window (five in the present example). Each storage unit preferably comprises a video RAM (VRAM). The rows of the color image are numbered 0, 1, 2, 3, . . . Each storage unit of the video RAM is operative to store some of the rows of the color unit, as follows:

First storage unit: rows 0, 5, 10, . . .
Second storage unit: rows 1, 6, 11, . . .
Third storage unit: rows 2, 7, 12, . . .
Fourth storage unit: rows 3, 8, 13, . . .
Fifth storage unit: rows 4, 9, 14, . . .

A VRAM rows buffer 86 constructed and operative in accordance with a preferred embodiment of the present invention is described below with reference to FIG. 24.

It is appreciated that this structure of the rows buffer 86 causes the relative order of the five available rows to vary. For example:

While the central pixel of the convolution window is in row 2, the order of the available rows in the five storage units is 0, 1, 2, 3 and 4, as shown conceptually by the contents of the VRAM in the first row in FIG. 19.

While the central pixel of the convolution window is in row 3, the available rows are 1, 2, 3, 4, 5; however the order of the available rows at the serial output ports of the row buffer 86 storage units is 5, 1, 2, 3, 4, as shown conceptually by the contents of the VRAM in the second row in FIG. 19.

While the central pixel of the convolution window is in row 4, the order of the available rows is 5, 6, 2, 3, 4, as shown conceptually by the contents of the VRAM in the third row in FIG. 19.

While the central pixel of the convolution window is in row 5, the order of the available rows is 5, 6, 7, 3, 4, as shown conceptually by the contents of the VRAM in the fourth row in FIG. 19.

While the central pixel of the convolution window is in row 6, the order of the available rows is 5, 6, 7, 8, 4, as shown conceptually by the contents of the VRAM in the firth row in FIG. 19.

While the central pixel of the convolution window is in row 7, the available rows are 5, 6, 7, 8, 9 (not shown). In other words, the relative order of the rows is the same while row 0 is being read as while row 5 is being read.

In general, the relative order of the rows while row 5R+r is being processed is the same as the relative order of the rows while row r is being processed, for integers R and r. Therefore, for example, the operation of the VRAM 86 and multiplexer 194 when the current row is row 5R+3 of the image, for any integer R, may be understood with reference to the second row of FIG. 19.

The multiplexer 194 is operative to permute the order of the rows such that the permuted order of the rows is always the same.

Referring specifically to FIG. 19, the first column from the left of FIG. 19 describes the five "relative orders" and locations of the available rows of row buffer 86 as explained above. For each illustrated row buffer in the first column of FIG. 19, the five numbers indicate the five available row numbers. The second column describes the cylic permutation introduced by multiplexer 194 for each of the "relative orders", for non-edge columns, i.e. for column 3 to column last−2, whose corresponding convolution window is complete and therefore contains no duplicated columns.

Columns 3 to 6 of FIG. 19 illustrate the cyclic permutation and row duplication functions performed by the multiplexer when rows are missing, which occurs when the current row is the first, second, next to last (last −1) or last row of the color image or page. The third column illustrates the correspondence between the available rows in rows buffer 86 and the 5 rows or lines of the convolution window for pixels in the first row of the color image. The fourth column illustrates the correspondence between the available rows in rows buffer 86 and the 5 rows or lines of the convolution window for pixels in the second row of the color image. The fifth and sixth columns of FIG. 19 illustrate the correspondence between the available rows in rows buffer 86 and the 5 rows or lines of the convolution window, for pixels in the next to last and last rows of the color image, respectively.

EXAMPLE

Figure 20:
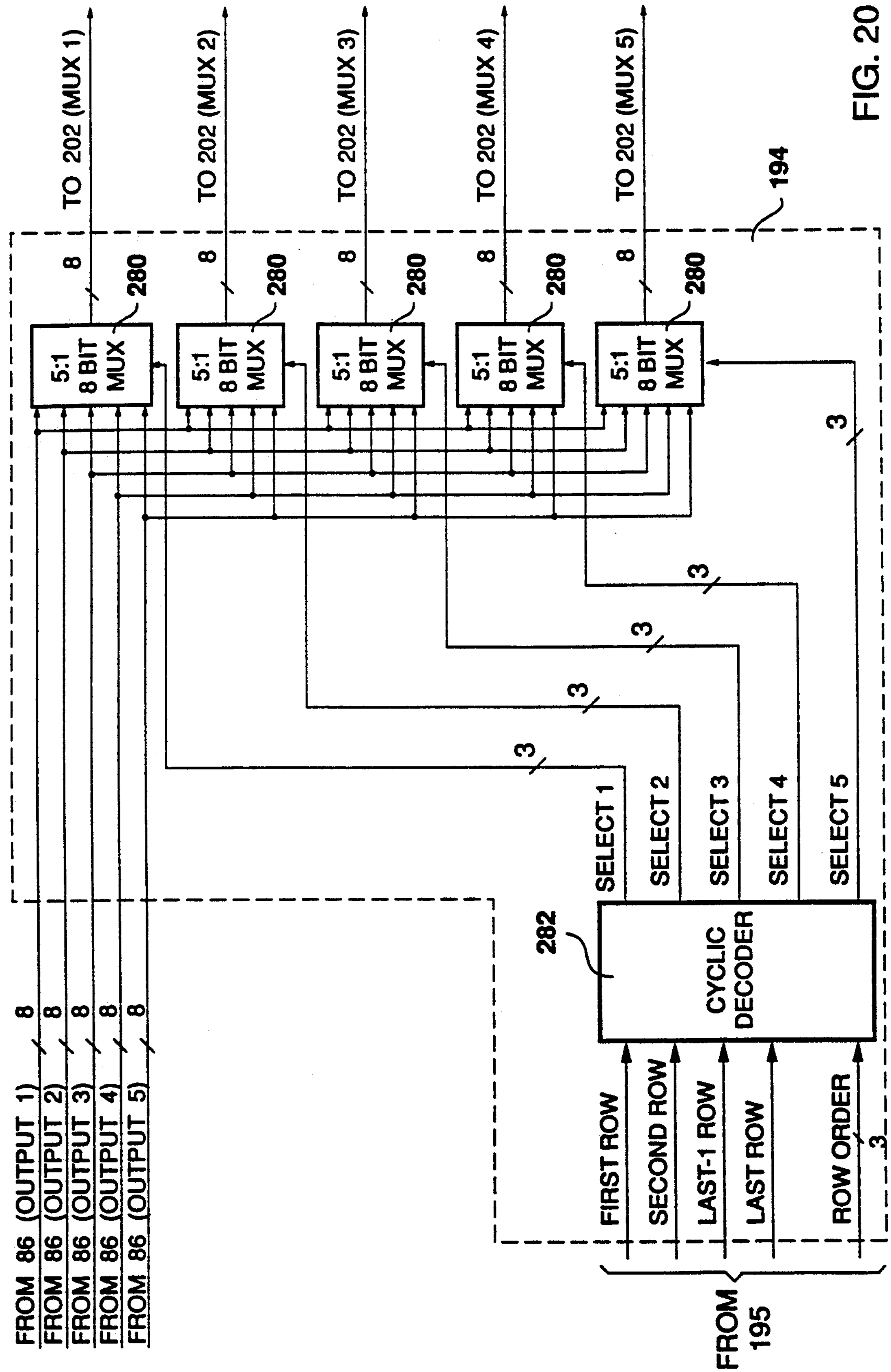
FIG. 20 is a block diagram of a multiplexer array 194 of FIG. 12 constructed and operative in accordance with a preferred embodiment of the present invention.

The operation of the VRAM 86 and the multiplexer 194 when the current row is row 5R+2 for any integer R will now be described with reference to the first row of FIG. 19. As seen in the first row of FIG. 19, the available rows in the five storage units of rows buffer 86 are respectively, 5R+0, 5R+1, 5R+2, 5R+3, and 5R+4. The multiplexer 194 operates with the "zero" permutation on these rows, and therefore, the input to the convolution apparatus remains in consecutive order. The rows of the convolution window, when the central pixel of the convolution is in rows 0, 1, last−2, last−1 and last, respectively, are as follows:

row 0: 0 0 0 1 2
row 1: 0 0 1 2 3
last−2 row: last−4 last−3 last−2 last−1 last
last−1 row: last−3 last−2 last−1 last last
last row: last−2 last−1 last last last Reference is now made to FIG. 20 which is a block diagram of multiplexer array 194 of FIG. 12 constructed and operative in accordance with a preferred embodiment of the present invention. The apparatus of FIG. 20 is a preferred implementation of the conceptual structure illustrated in FIG. 19. The multiplexer array 194 of FIG. 20 comprises five 5 to 1 eight bit wide multiplexers 280 each of which receives all five outputs from rows buffer 86, described in detail in FIG. 24, corresponding to the five rows of the convolution window. Each multiplexer 280 also receives a 3 bit select signal from a cyclic decoder 282 which selects the individual one from among the five rows input by the multiplexer 280 which is to be provided to the corresponding multiplexer of selector 202 of FIG. 12.

Cyclic decoder 282 is a combinatorical decoder which receives the following signals from central ALU 195:

ROW ORDER: a 3 bit signal of the relative order of the available rows of rows buffer 86 which are received by the multiplexers 280.

FIRST ROW, SECOND ROW: 1 bit signals respectively indicating whether the available row of rows buffer 86 having the lowest serial number is the first or the second row of the image.

LAST ROW, LAST −1 ROW: 1 bit signals respectively indicating whether the available row of rows buffer 86 having the highest serial number is the last or the next to last row of the image.

Cyclic decoder 282 is operative to provide the five select signals to the five multiplexers 280 respectively in accordance with the five signals arriving from central ALU 195, as described above with reference to FIG. 12.

In the illustrated embodiment, multiplexers 280 each interface identically with the five incoming signals from rows buffer 86 and the incoming signals are not permuted before they arrive at the multiplexers 280. Instead, the cyclic permutations of the incoming signals are determined by the select signal provided by decoder 282. Alternatively, however, the cyclic permutations may be provided by having the five multiplexers each interface with the five incoming signals from rows buffer 86 so as to permute the incoming signals. In other words, the signals arriving at the first, second, third, fourth and fifth multiplexers may be respectively permuted in accordance with the cyclic permutations illustrated in the first, second, third, fourth and fifth rows of the second, "non-edge" column of FIG. 19. In this alternative, the select signal of the cyclic decoder is only operative to determine the "deviations" from the cyclic permutations which are necessary to deal with the edges of the color image, as explained above with reference to the last four columns of FIG. 19.

Appendix H is a EPM5128 netlist generated by a component generating software package commercially available under the mark MAXPLUS from Altera, 2610 Orchard Parkway, San Jose, Calif., USA. This netlist is a complete description of the cyclic multiplexer whose operation is described in FIG. 19.

Figure 21:
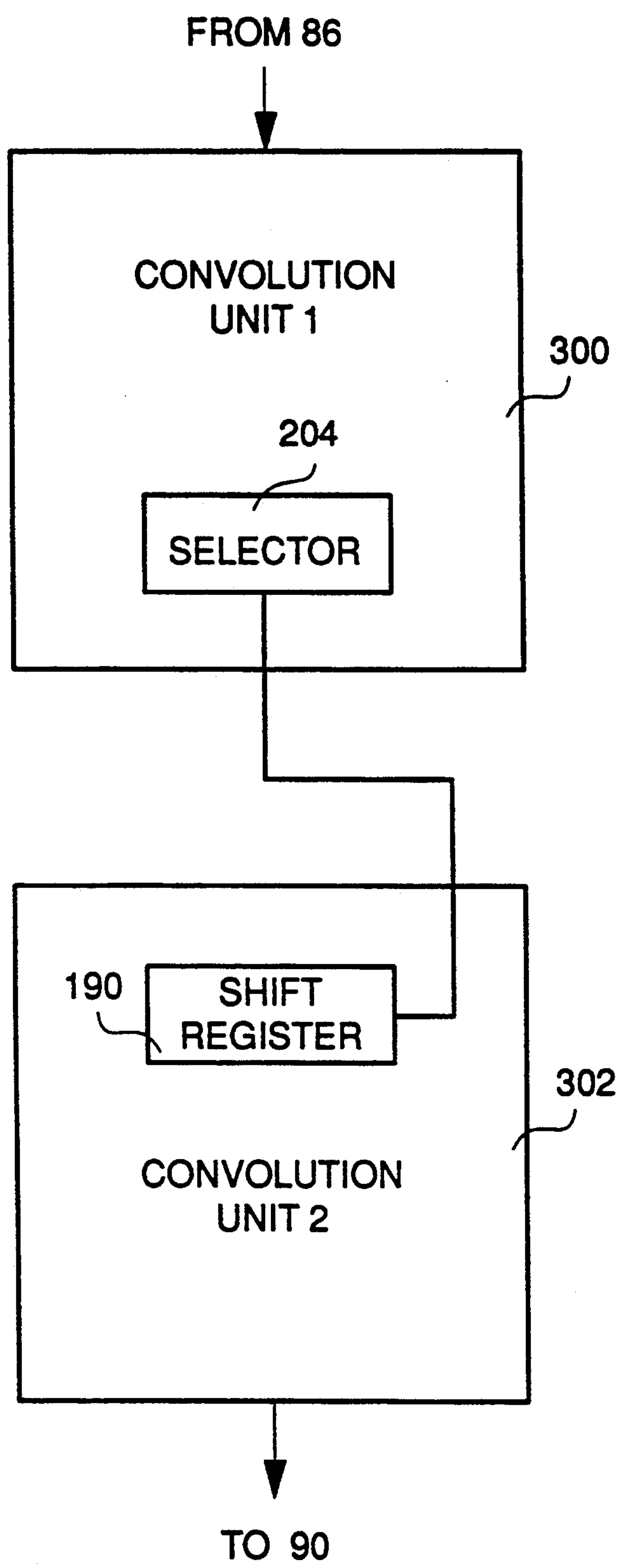
FIG. 21 is a block diagram of a pipeline cascaded embodiment of scaler 96 of FIG. 8.

Reference is now made to FIG. 21, which is a block diagram of a pipeline cascaded implementation of scaler 96 of FIG. 8. According to a preferred embodiment of the present invention, several convolution scalers of the type shown and described in FIG. 12 may be combined in order to increase speed of processing. FIG. 21 illustrates use of pipeline cascading. Pipeline cascading is a known acceleration technique and is described in *Computer Architecture and Parallel Processing*, Hwand and Briggs, McGraw Hill, 1984, the disclosure of which is incorporated herein by reference.

In FIG. 21, a first convolution unit 300, which may be substantially identical to the convolution scaler 96 of FIG. 12, performs column convolutions and outputs, via its selector 204, to the shift register 190 of a second convolution unit 302 which may be substantially identical to first convolution unit 300. The second convolution unit 302 is operative to perform row convolutions on the output of the first convolution unit 300.

Alternatively or in addition to pipelined processing, the processing can be speeded up by parallel execution of the convolutions on each of the typically three or four separations of the image by providing a convolution unit, or a pair of convolution units as illustrated in FIG. 21, for each separation. Parallel cascading is described in *Computer Architecture and Parallel Processing*, Hwang and Briggs, McGraw Hill, 1984, the disclosure of which is incorporated herein by reference.

According to a preferred embodiment of the present invention, more than one convolution unit 300 and/or more than one convolution unit 302 may be provided. The ratio of the number of convolution units 300 to the number of convolution units 302 is a function of the ratio of the input resolution to the output resolution.

Figure 22:
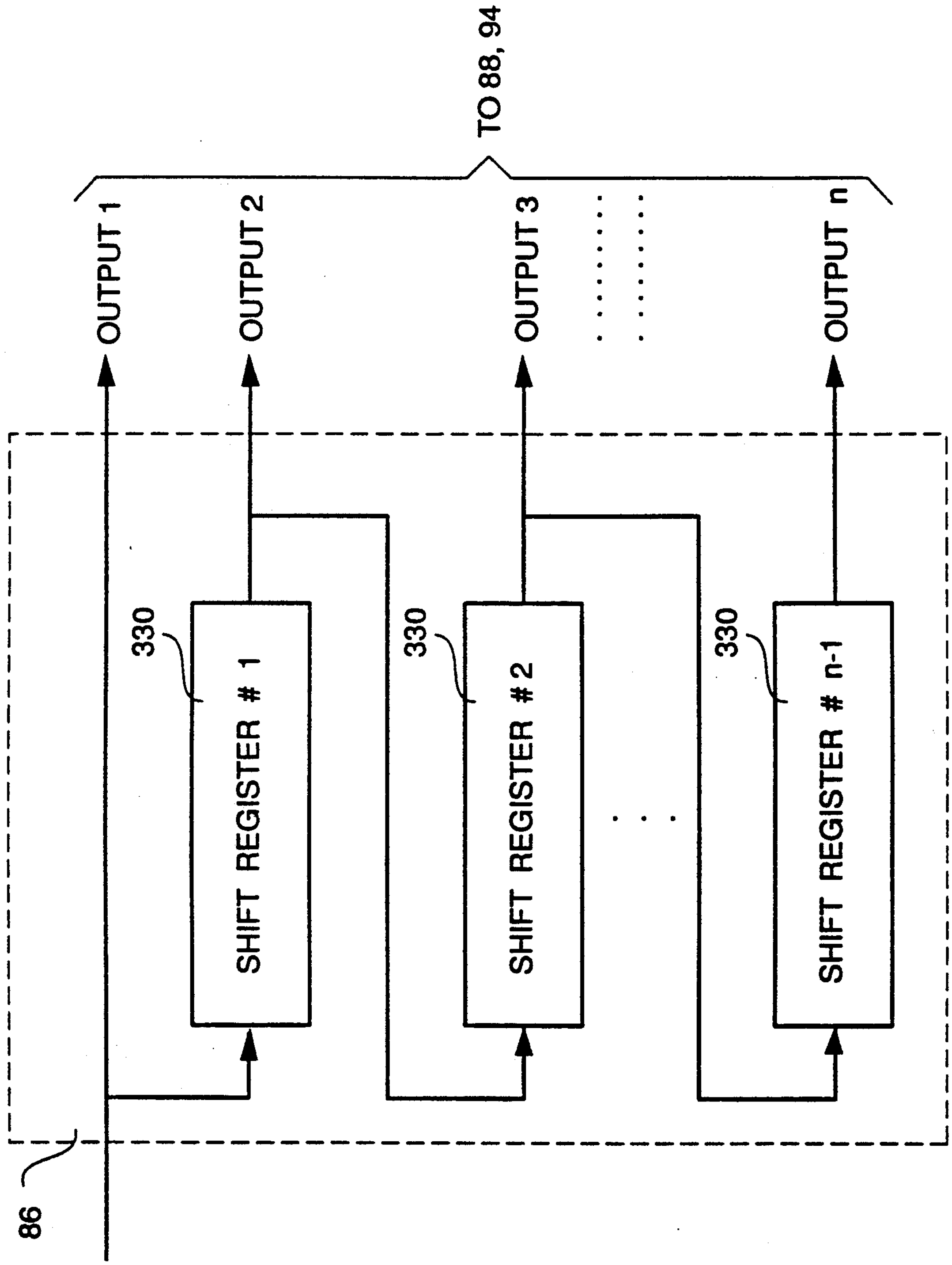
FIG. 22 is a block diagram of row buffer 86 of FIG. 8 constructed and operative in accordance with a first alternative embodiment of the present invention.
Figure 23:
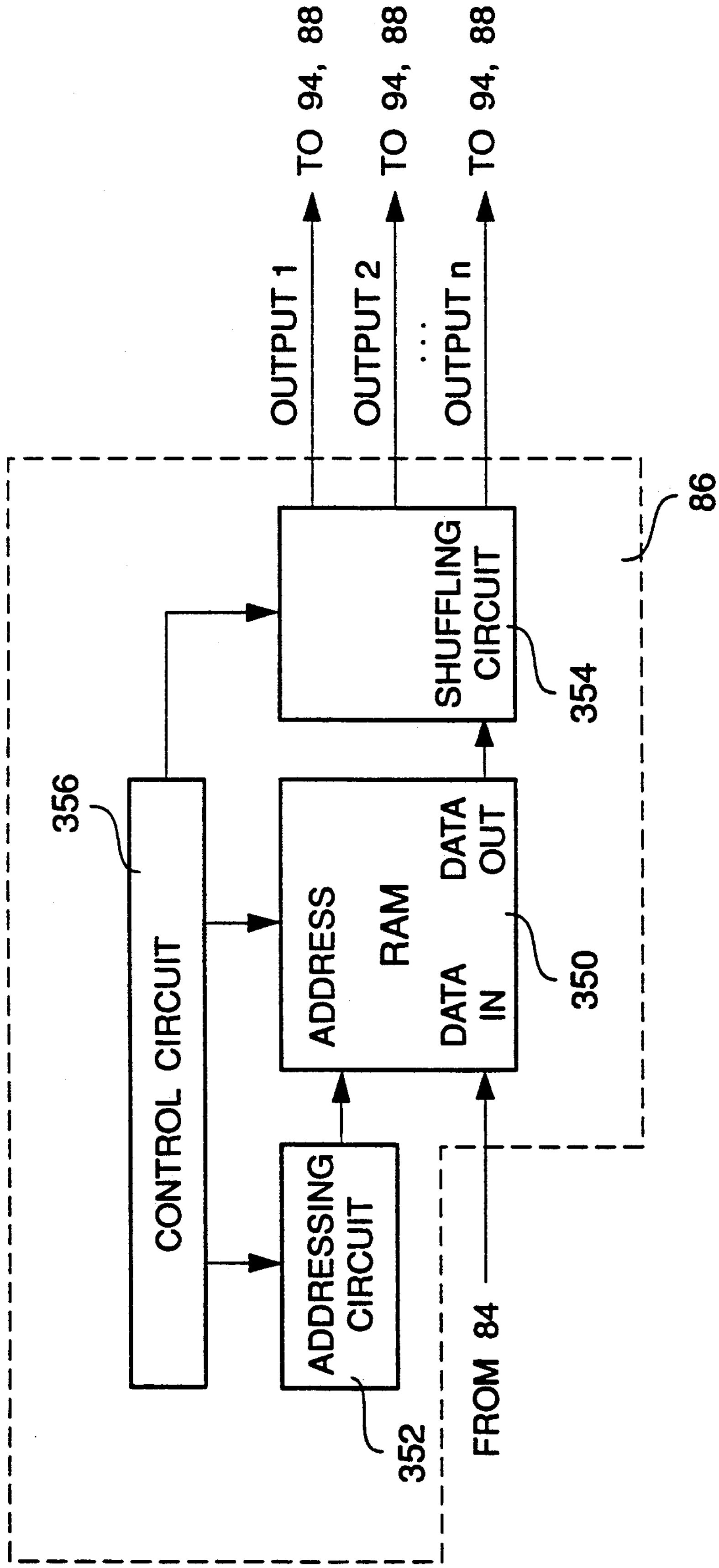
FIG. 23 is a block diagram of row buffer 86 of FIG. 8 constructed and operative in accordance with a second alternative embodiment of the present invention.
Figure 24:
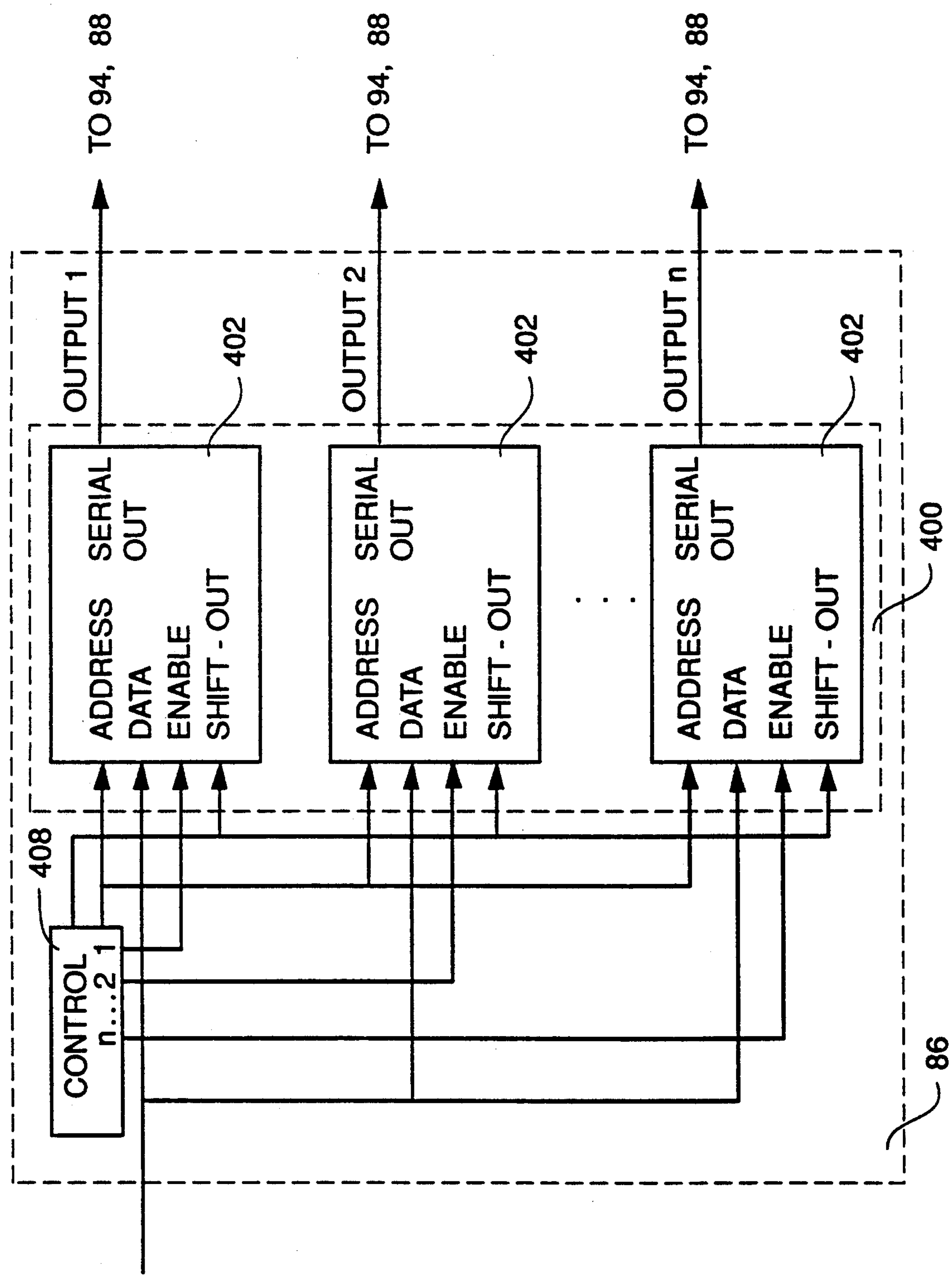
FIG. 24 is a block diagram of row buffer 86 of FIG. 8 constructed and operative in accordance with a third and preferred embodiment of the present invention.

A number of alternative embodiments for implementing rows buffer 86 of FIG. 8 will now be shown and described, with reference to FIGS. 22–24. The input to each of the row buffers of FIGS. 22–24 is preferably a stream of CT pixels, each including a validity bit provided by validity bit coder 84 of FIG. 8.

Reference is now made to FIG. 2, which is a block diagram of rows buffer 86 of FIG. 8 constructed and operative in accordance with a first alternative embodiment of the present invention.

The rows buffer 86 comprises an array of $n-1$ shift registers 330, operatively associated with one another as shown. Each shift register stores a row of the color image. The input stream to the shift register array is split into n output streams, each stream being delayed relative to the next by a single row length of the image. An n by m window is defined by examining m pixels in each of the n streams. Since shift registers are relatively expensive per bit, providing a relatively large number of registers, each large enough to store an entire row of the image, may not be optimal in terms of cost.

Reference is now made to FIG. 23, which is a block diagram of a rows buffer constructed and operative in accordance with a second alternative embodiment of the present invention.

The rows buffer of FIG. 23 is based upon a RAM 350 and peripheral circuits preferably including an addressing circuit 352, a shuffling circuit 354 and a control circuit 356. The peripheral circuits are provided in order to allow the RAM to simulate the operation of an array of shift registers such as the array of FIG. 22. Although RAMS are relatively inexpensive per bit, the peripheral circuits are relatively cumbersome and expensive.

Reference is now made to FIG. 24, which is a block diagram of a rows buffer constructed and operative in accordance with a third and preferred embodiment of the present invention which is based upon a video RAM array 400 and which takes advantage of the fact that video RAMS have some of the properties of both RAMs and of shift registers. Any suitable commercially available video RAMs can be used to implement the structure of FIG. 24 such as TMS44C251, commercially available from Texas Instruments, Dallas, Tex., USA. The rows buffer shown and described in FIG. 24 is operative to re-shuffle an input stream of data arranged in rows into data suitable for processing by $n\times m$ convolution apparatus. Preferably, the rows buffer of FIG. 24 is also operative to convert one data format to another, such as a line-interleave to pixel-interleave conversion, as required. The rows buffer of FIG. 24 can also serve as a general purpose dual buffer for CT or LW data.

According to one embodiment of the present invention, the array 400 of video RAMs comprises a plurality of n video RAM units 402 arranged along a single bus, where n is the number of rows of the convolution window. A typical value for n is 5. Each video RAM unit 402 comprises 2 four bit wide VRAMs, for the 8 bit color data of each row and a third VRAM, for the validity bit of each row.

Each video RAM unit 402 has a random access input port and a serial output port. The rows buffer 86 also comprises a control circuit 408 which is operative to send a single address and "shift-out" signal to each of the video RAMs, and to cyclically send an "enable" signal to the random input of only one of the video RAM units. In other words, only one of the video RAM units is initially enabled, so only that video RAM unit receives input data. The control circuit 408 also comprises a refresh mechanism (not shown) for the video RAM. Once a complete row has been loaded onto a video RAM unit 402, a second video RAM unit 402 is enabled and a row is loaded thereon, and so on.

Each row loaded into a particular vide RAM unit is subsequently transferred to the shift registers forming part of the video RAMs within that video RAM unit and is then shifted out serially. As the row is shifted out, other data may simultaneously be loaded at the random port of the VRAM unit, thereby increasing efficiency. Since the shift out needs only one clock after block initialization, the address may be used mainly for the random ports.

A preferred mode of operation of a video RAM rows buffer constructed in accordance with the embodiment of FIG. 24 and being operative in accordance with a cyclic permutation introducing multiplexer is described above with reference to FIG. 19.

Figure 25:
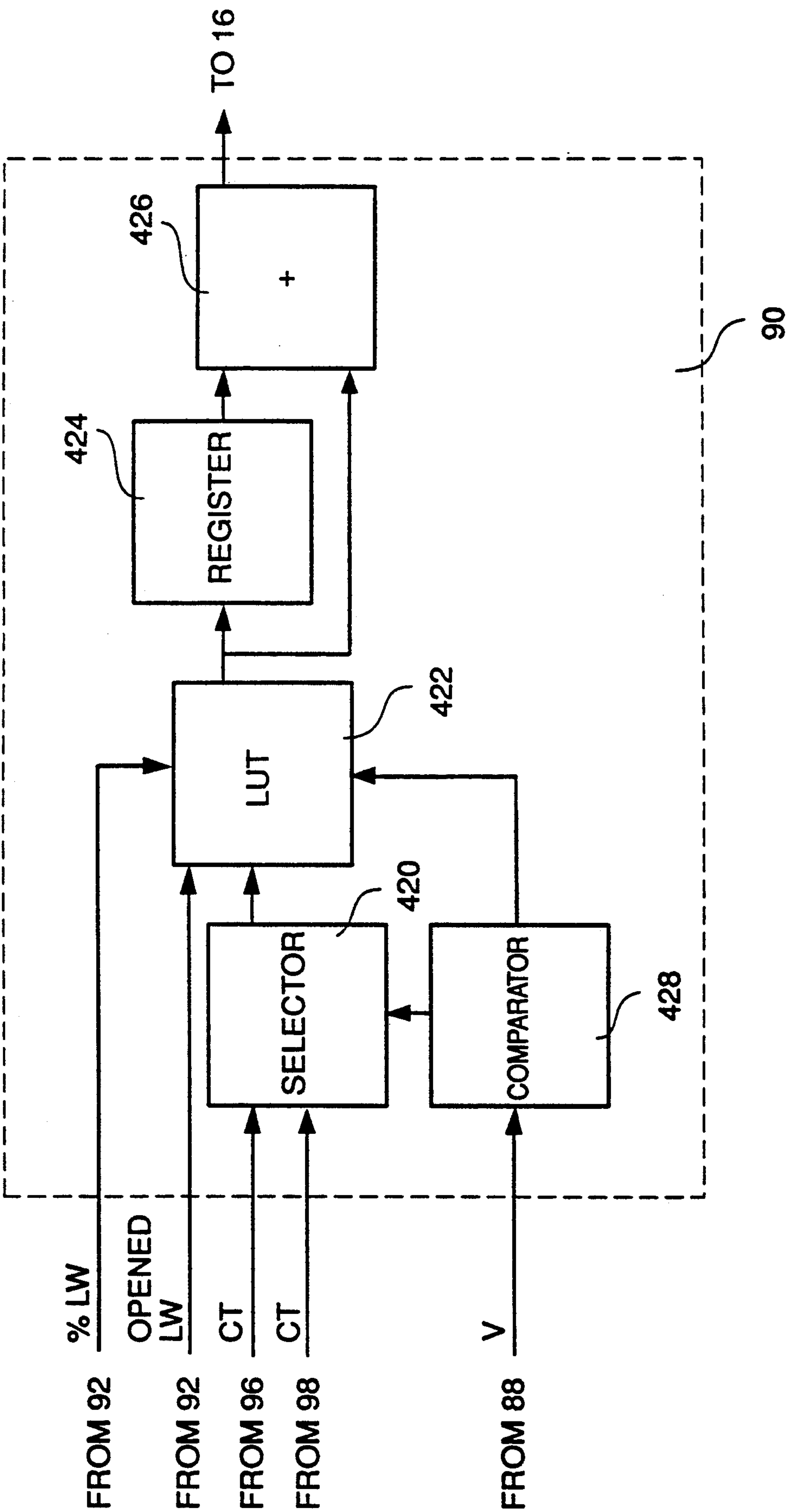
FIG. 25 is a generalized block diagram of selector 90 of FIG. 8.

Reference is now made to FIG. 25, which is a block diagram of selector 90 of FIG. 8. As described above, selector 90 is operative to select a value for the output pixel from among the following: the opened LW output of averager 92, the output of scaler 96, the output of scaler 98, or some combination of the above. Selector 90 typically assigns a value to the pixel being processed as a function of the "validity" signal output of decoder 88 and the % LW output of averager 92, as follows:

If the output of the decoder is 25 (for $5\times 5$ convolution), then the convolution performed by scaler 96 is valid and the output of scaler 96 is assigned to the present pixel.

If the output of the decoder is less than 25, then:

if the LW percentage signal (%LW) is zero, the output of scaler 98 is assigned to the present pixel;

if the LW percentage signal is 100, the LW value output by averager 92 is assigned to the present pixel;

if the LW percentage signal is between 0 and 100, the value assigned to the present pixel is some combination of CT and LW.

The selector 90 typically comprises selecting means 420, a LUT 422, a register 424, an adder 426 and a comparator 428, interconnected as shown. The sum of validity bits arriving from validity decoder 88 of FIG. 8 is compared with 25 by comparing means 428. Comparing means 428 then provides a suitable binary signal to selecting means 420. The binary signal is the criterion used to select a CT stream from among the two CT streams arriving from scalers 96 and 98, the LW stream, or a combination thereof, as explained above with reference to FIG. 8. The selected output stream, the %LW signal received from averager 92 and the validity signal received from comparator 428 together address the LUT 422. The V input to the comparator 428 is used for extracting data from LUT 422, which data is normalized according to the number of valid participating CT pixels as explained above with reference to FIG. 18.

The LUT 422 contains two types of data, computed by the following two equations respectively:

$$data1 = 0.01 \times LW \times \%LW$$

$$data2 = 0.01 \times CT \times (100 - \%LW)$$

where CT is the % dot signal arriving from the selected one of scaler 96 or scaler 98, respectively. The LW % dot signal and %LW signal arrive from averager 92 via LUT 100 if provided.

Register 424 and adder 426 are operative to receive a data1 and a data2 value, add them and output the sum. This is done by extracting the data1 value from LUT 522 and storing it in register 424. Subsequently, the data2 value is extracted from LUT 422 and added to the data1 value in register 424 by the adder 426.

Figure 26:
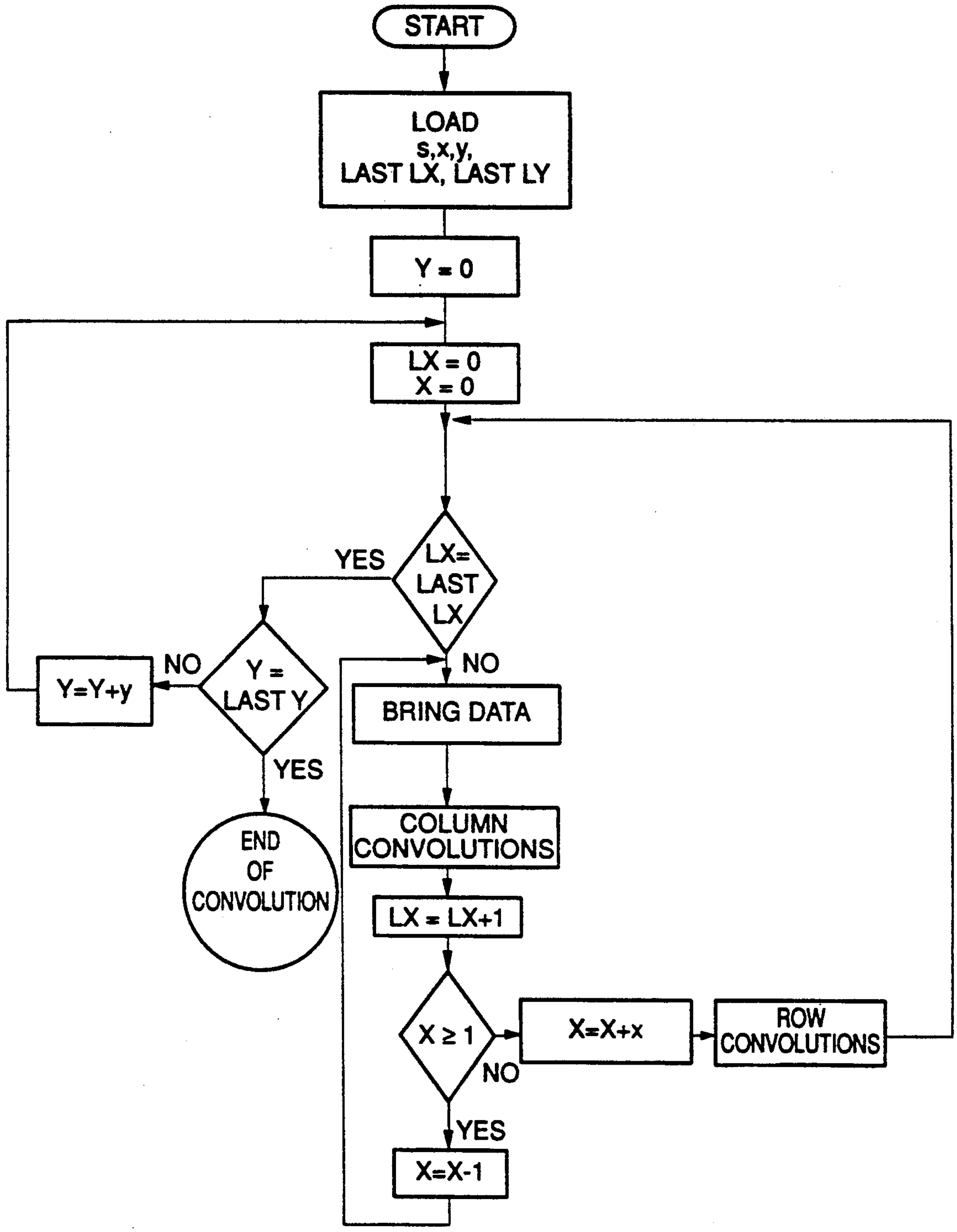
FIG. 26 is a flow chart describing a preferred method for control of column convolution useful in implementing ALU 195 of FIG. 12.

FIG. 26 is a flow chart describing a preferred method for control of two dimensional convolution, useful in implementing ALU 195 of FIG. 12.

As shown, the first step is loading of the following parameters: x, y, last LX, last Y and s, where:

x is defined as the ratio between the CT input resolution along the horizontal axis and the output resolution along the horizontal axis. For example, in FIG. 13, x=2.5;

y is defined as the ratio between the CT input resolution along the vertical axis and the output resolution along the vertical axis;

last LX=the number of pixels per row;

last Y=the number of rows in the color image or page; and s=the number of separations of the color image, for color image applications.

The following variables are then initialized: Y, LX, X; where:

Y indicates the location of the current CT pixel, relative to the current output pixel, along the vertical axis and controls row convolution operation. The integer part of Y indicates the middle row of the convolution window, i.e. the row within which the central convolution pixel resides. Therefore, Y remains constant throughout the processing of any particular row. At the end of each row, Y is incremented by y, which is the ratio of CT resolution to output resolution along the vertical axis. Y is also useful in selecting row coefficients for column convolution operations. Specifically, the fractional part of Y is used by ALU 195 to access the coefficient table 216; and LX indicates the location of the current CT pixel, relative to the current output pixel, along the horizontal axis and controls column convolution operation. The integer part of LX indicates the middle column of the convolution window, i.e. the column within which the central convolution pixel resides. LX is incremented by one on every clock for which X>=1; and X, as described above with reference to FIG. 13, is useful in controlling and sequencing the convolution operations within a given row. As seen in FIG. 26, row convolution is initiated on clocks for which the value of X is less than 1. On those clocks, the value of X is incremented by x. On all other clocks, the value of X is decremented by 1. X is also useful in selecting column coefficients for row convolution operations. Specifically, the fractional part of X is used by ALU 195 to access the coefficient table 216 of FIG. 12.

While LX is less than "last LX", the current row is convolved, pixel by pixel. For each pixel, data for all four separations is brought; column convolution is performed on the current pixel, as indicated by LX, for all separations; LX is incremented by 1; row convolution is performed on the accumulated partial results for all separations if X is greater than 1; and the value of X is updated as explained above.

When LX=last LX, the entire current row has been convolved. If LY=last LY, the current row is the last row and the convolution of the image is complete. If LY is less than "last LY", Y is updated to refer to the next row and convolution of the next row is initiated.

Figure 27:
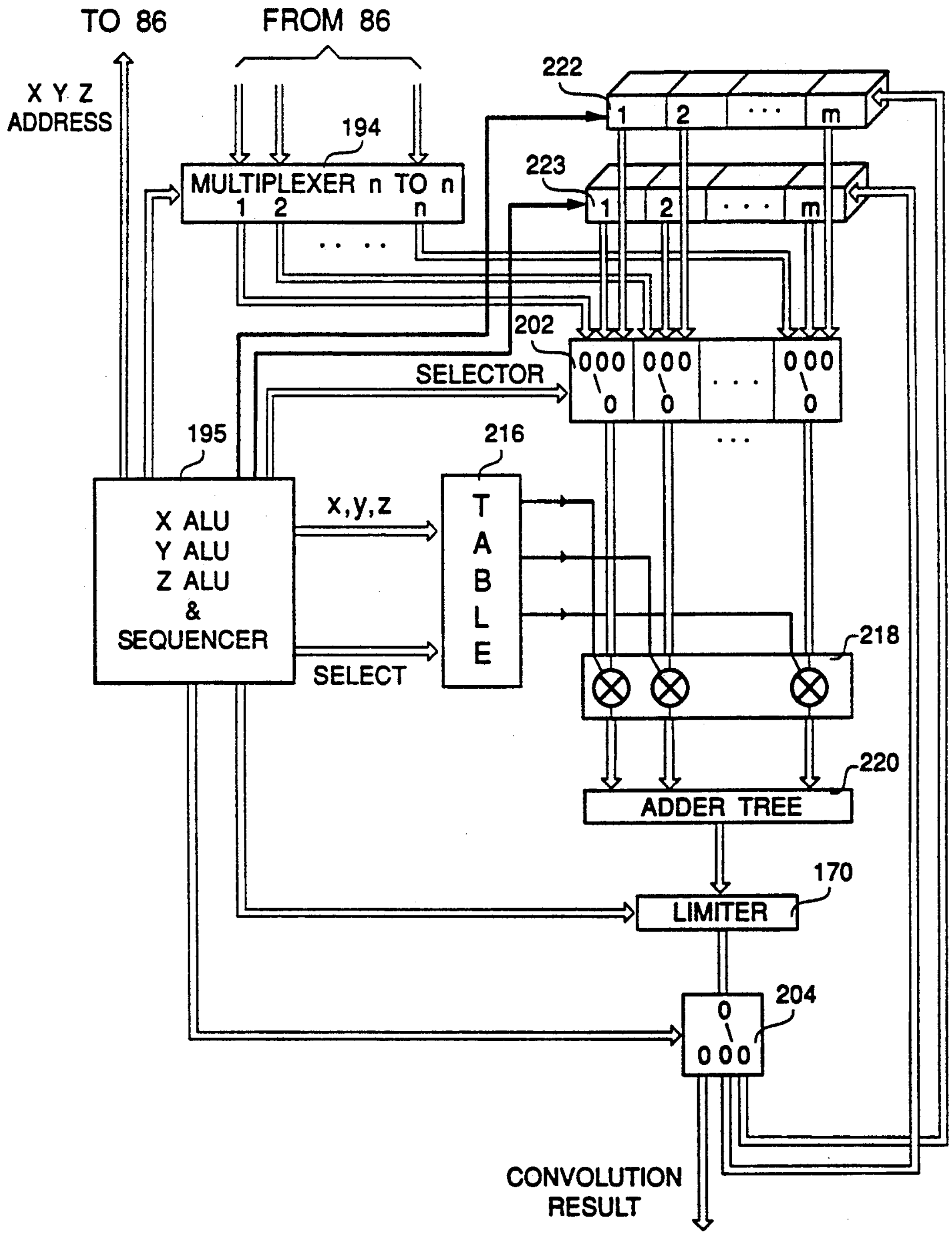
FIG. 27 is a block diagram of a three dimensional convolution scaler which is an extension of the two dimensional convolution scaler of FIG. 12.

Reference is now made to FIG. 27, which is a block diagram of a three dimensional convolution scaler which is an extension of the two dimensional convolution scaler of FIG. 12. It is appreciated that the principles by which the apparatus of FIG. 12 is expanded to provide FIG. 27 are general and are useful in converting a d; dimensional convolver to a d+1 dimensional convolver. To convert the two dimensional convolver of FIG. 12 to the three dimensional convolver of FIG. 27, the following modifications are made:

a. A shift register 222 is added, which is operative to store row convolutions, which are now partial results rather than being final results. Shift register 222 may be generally identical to the shift register 190 of FIG. 12.

Shift register 190 is replaced by a shift register array 223 which is five times larger than the shift register 190, in order to allow column convolutions to be stored for five values of z, the third dimension. In other words, shift register 223 preferably comprises an array of five shift registers, each of which may be generally identical to the shift register 190, and each of which corresponds to a value of z.

b. Multiplexer 202 is operative to multiplex 3 to 1, rather than 2 to 1 as in FIG. 12. Alternatively, multiplexer 202 may be a 2 to 1 multiplexer and the selection between shift register units 222 and 223 may be in accordance with output enable signals arriving from the control sequencer 195.

c. Coefficient table 216 is operative to store the new axis coefficients as well as row coefficients and column coefficients.

d. Suitable modifications are made in central ALU 195, to accomodate the new dimension or z axis. An algorithm useful in implementing central ALU 195 for the embodiment of FIG. 27 is presented in the flowchart of FIG. 28. Central ALU 195 may be based upon a WS59032 component, commercially available from Wafer Scale.

e. The switch 204 is a three position switch rather than a two position switch as in FIG. 12. Alternatively, switch 204 may be a two position switch and the selection between shift register units 222 and 223 may be in accordance with suitable addressing signals arriving from the control sequencer 195.

The number of multipliers need not increase as the dimension of the apparatus is increased, and may remain n, the number of pixels along the first axis of the convolution window. The convolution window is now a three dimensional array.

Generally, the apparatus of FIG. 27 is constructed and operative similarly to the apparatus of FIG. 12, apart from the differences discussed above, and therefore the discussion of various aspects of the apparatus of FIG. 12, such as pipeline delay, treatment of the edges of the image and overwriting issues is not repeated here.

Figure 28:
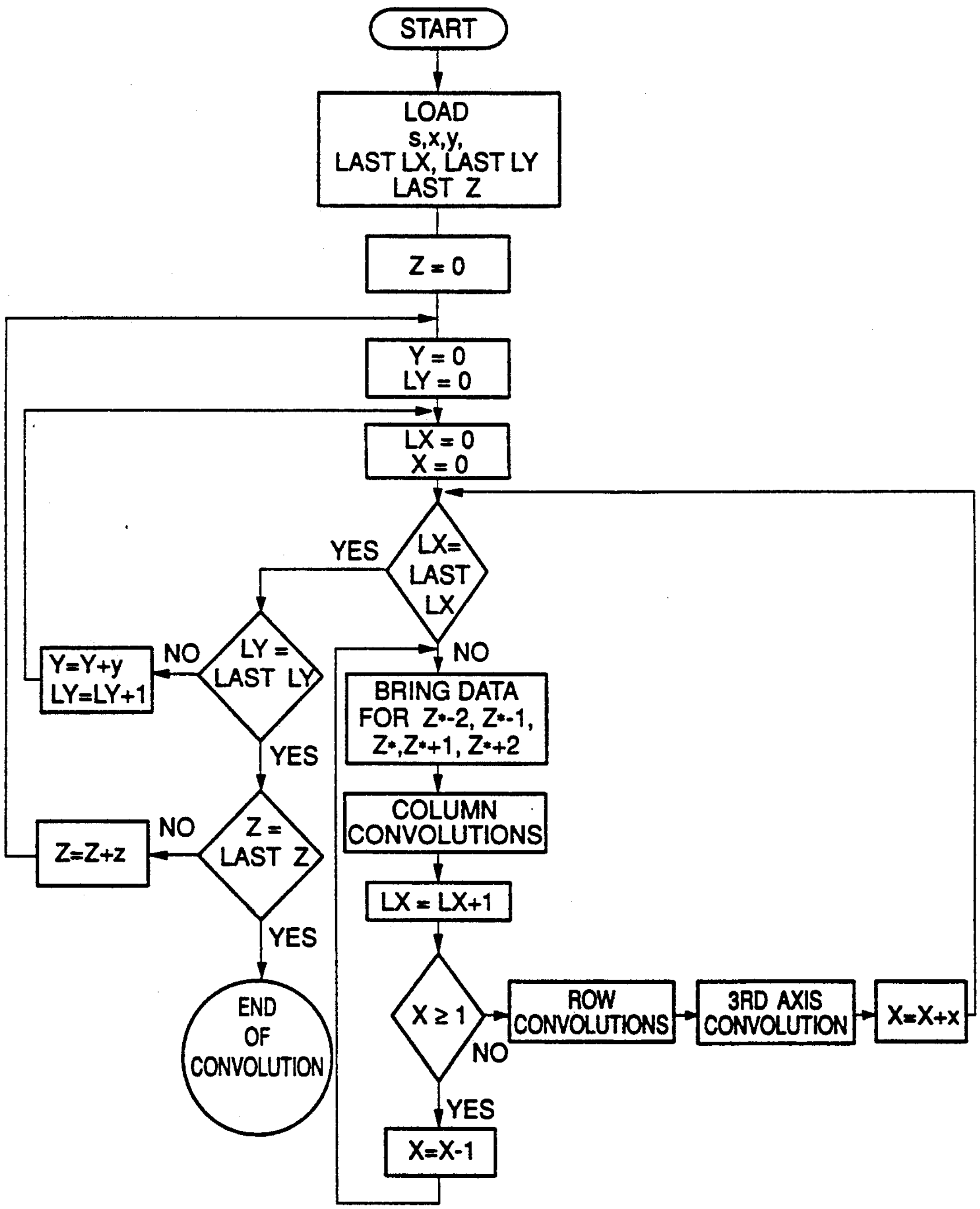
FIG. 28 is a flow chart illustrating a preferred algorithm useful in implementing central ALU 195 for the embodiment of FIG. 27.

Reference is not made to FIG. 28 which is a flow chart illustrating an algorithm useful in implementing central ALU 195 for the embodiment of FIG. 27. The three dimensional algorithm of FIG. 28 is more clearly understood by comparison to the two dimensional algorithm of FIG. 26.

The algorithm of FIG. 28 is generally similar to the algorithm of FIG. 26, except for the following differences:

A variable X is used to indicate the position along the third dimension or z axis.

A parameter z is defined as the input:output resolution along the third dimension and is analogous to x and y as defined above with reference to FIG. 26.

A parameter "last Z" is defined. "Last Z" is the number of positions along the third axis or z dimension.

A parameter "last LY" is defined which is the number of positions along the second axis of y dimension. In FIG. 26, this parameter was called "last Y".

The variable Y which is useful for controlling the convolution operations along the second dimension is defined analogously to the variable X which is useful for controlling the convolution operations along the first dimension and which is discussed above with reference to FIG. 26.

The "bring data" step in FIG. 26 comprises the step of bringing data for a single column convolution. The "bring data" step in FIG. 28 comprises the step of bringing enough data for a single column convolution for each of five positions along the third axis. These positions are termed $Z^*-2$, $Z^*-1$, Z, $Z^*+1$, $Z^*++2$ where $Z^*$ is the integer part of Z and indicates the central position, along the third dimension, of the current convolution window.

The column convolution step and the subsequent row convolution step are then carried out for the five different positions along the third axis, thereby to provide 5 row convolution results. The row convolutions are now partial results which may be stored in shift register array 222 of FIG. 27. Z convolution is then carried out on the 5 row convolution results.

Figure 29:
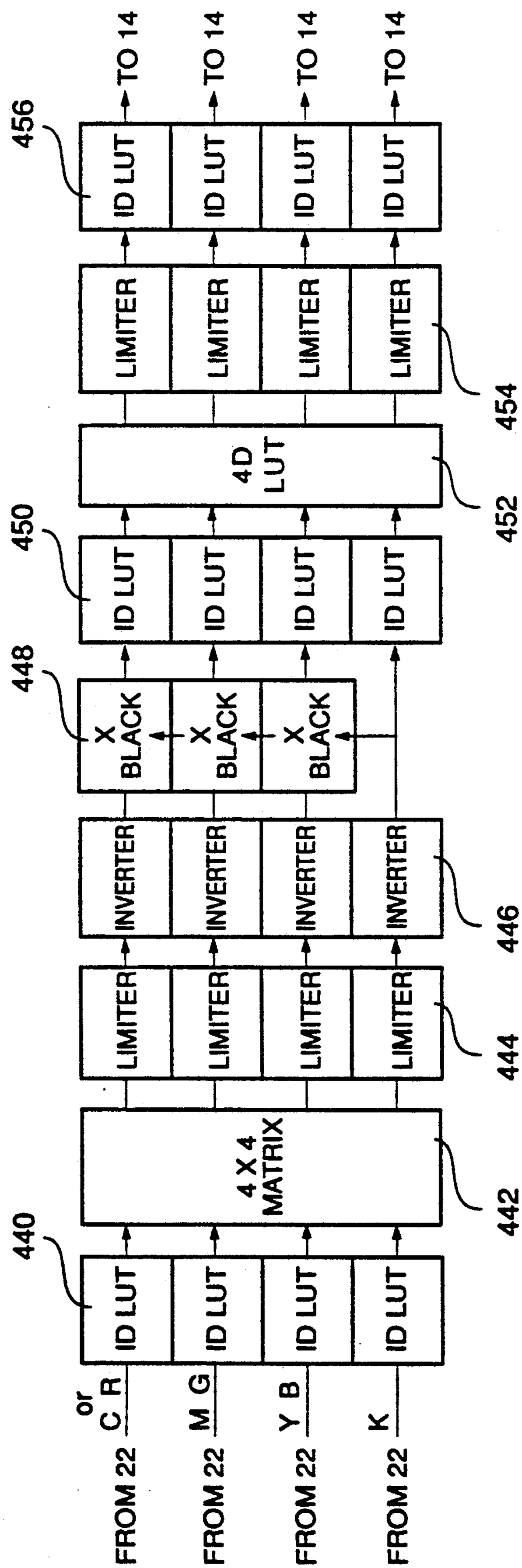
FIG. 29 illustrates in conceptual form color image processing apparatus of the preferred embodiment of color unit 12 of FIG. 1.

Reference is now made to FIG. 29, which illustrated in conceptual form color image processing apparatus for color processing of an image represented in a color coordinate system such as the CMYK coordinate system or, alternatively the RGB coordinate system or any other suitable color coordinate system.

Figure 41:
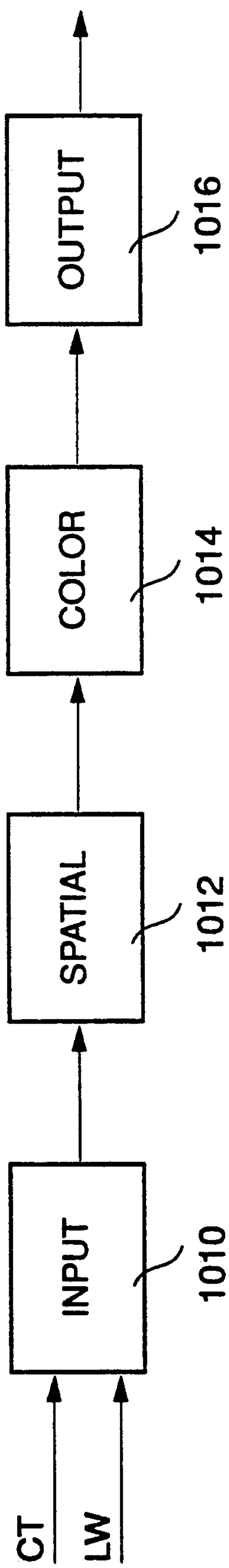
FIG. 41 is a generalized block diagram of a preferred hardware implementation of image processing apparatus constructed and operative in accordance with a fifth preferred embodiment of the present invention.

The color processing apparatus of FIG. 29 forms a preferred embodiment of a color processing unit such as the color processing unit 12 of FIG. 1 or unit 1014 of FIG. 41. The color processing apparatus is general and may be employed to introduce substantially any suitable color transformation to the color image, such as d dimensional color transformations, where d=1, 2, 3 or 4.

For example, the color processing apparatus may preferably be employed to input a representation of a color image, and to output another representation of a color image which, when printed by a first given color printing device, will appear substantially identical to the input representation printed on a second given color printing device, which may or may not be identical with the first color printing device.

Preferably, the color processing apparatus of FIG. 29 may also be employed for converting color values in a first color coordinate system such as RGB to color values in a second color coordinate system such as CMYK.

Preferably, the color processing apparatus of FIG. 29 may also be employed for changing the amount of black colorant provided. Conventional black removal and addition techniques are discussed in the following documents, the disclosures of which are incorporated herein by reference:

Johnson, T. "The application of printing specifications to gray components replacement", TAGA Proceedings, 1988, p. 502; and J. A. C. Yule. *Principles of Color Reproduction,* New York: Jon Wiley & Sons, 1967.

Preferably, the color processing apparatus of FIG. 29 may also be employed in color data communications applications, in order to convert data in a particular format to data in another format, such as a standard format which it is desired to adopt.

Preferably, the color processing apparatus of FIG. 29 is also useful for editing color images. In particular, transformations which it is sought to apply to the color image being edited may be applied to one of the LUTs of FIG. 29, such as LUT 452, instead. Application of the transformation to the LUT rather than to the color image results in relatively high processing speed.

The color processing apparatus of FIG. 29 also preferably enables a correction which was specified by an observer of a final image, such as an image viewed on an output device, to be suitably implemented on a precursor of the final image. For example, assume that a customer observing a final image on a proofer requests that 5% be added to the yellow separation or component. A preferred method for doing this is to construct a LUT which represents the relationship between the final image and the precursor image, i.e. which represents the inverse of the color transformations which produced the final image form the precursor image. The value with the 5% addition is then passed through the LUT, and the output value will be the desired value of the yellow component of the precursor image. Generally, the output value is not the original precursor image value plus 5%.

The color processing apparatus of FIG. 29 may also preferably be employed to provide a reproduction of the color image which resembles a target representation except that certain selectable modifications have been made on the reproduction. One criterion for identical appearance of two analog representations of a color image is that the two representations, when read by a given color reading device, will yield substantially identical digital representations of the color image. This criterion may or may not result in analog representations which appear substantially identical to the human eye, depending on the extent to which the characteristics of the color reading device resemble the color reading characteristics of the human eye. Therefore, it is sometimes desirable to correct a reproduction of an analog representation of a color image, derived using a color reading device as reference, so as to compensate for the differences in the color reading characteristics between the color reading device and the human eye.

The above applications and other applications are discussed in detail below and in a coassigned Israel Patent Application, the disclosure of which is incorporated herein by reference. A copy of this document is appended hereto and is referenced Appendix C.

The color processing apparatus of FIG. 29 may receive color image data from a suitable input device such as a FIFO, and may output to a suitable output device such as a FIFO.

The color image data processed by the apparatus of FIG. 29 may be 4 dimensional, such as CMYK data. However, it is appreciated that the color image data may in fact have any other suitable number of dimensions such as three dimensions.

The color processing apparatus of FIG. 29 typically comprises a first LUT array 440 comprising four one-dimensional LUTs, a 4×4 matrix 442, first limiting means 444, inverting means 446, multiplying means 448, a second LUT array 450 comprising four one-dimensional LUTs, a four-dimensional LUT 452, second limiting means 454, and a third LUT array 456 comprising four one-dimensional LUTs.

It is appreciated that many modifications of the above structure are possible. In particular, adjacent LUTs/-matrices may be united into a single LUT/matrix.

Preferably, a plurality of suitably arranged exits and bypasses is provided (not shown) to alloy only certain portions of the processing apparatus to be used in applications where this is desired. A preferred bypass and exit structure comprising 4 exits and 2 bypasses is as follows, it being appreciated that any suitable bypass and exit structure may be substituted therefor:

| Exits: | | | |
|---|---|---|---|
| | between | and | Function |
| 1. | LUT 440 | Matrix 442 | use one 1D LUT |
| 2. | Limiter 444 | Inverter 446 | use 1D LUT and matrix |
| 3. | Multiplier 448 | LUT 450 | use 1D LUT, matrix & black multiplication |
| 4. | Limiter 454 | LUT 456 | skip last 1D LUT |

| Bypasses: | | | | |
|---|---|---|---|---|
| | from between | and | to between | and |
| 1. | LUT 440 | Matrix 442 | Limiter 444 | Inverter 446 |
| | | Bypassed unit: | Matrix multiplication | |
| 2. | Limiter 444 | Inverter 446 | Multipliers 448 | LUT 450 |
| | | Bypassed unit: | Black multiplication | |

Four examples of functions which it may be desired to implement using the apparatus of FIG. 29, and how they may be implemented using the above exit and bypass structure, are as follows:

1. 1D LUT only: Use bypass 1, bypass 2, exit 3.
2. Color correction without matrix multiplication: Use bypass 1, bypass 2.
3. RGB Scanner (no black to multiply by): Use bypass 2.
4. Matrix multiplication only without 4D LUT: Use bypass 2, exit 3.

The operation of the apparatus of FIG. 29 is preferably as follows: CT pixels are sequentially input to 1D LUT array 440. The four components C, M, Y and K of the input pixel are received by a corresponding one of the four 1D LUTs 440 which are each operative to perform suitable modifications of each of the components of the input vector independently, such as adjustment for the particular characteristics of the particular reading device employed. For example, if the color reading apparatus employed to read the input pixel is known to separate dark colors poorly, these colors must be "spread out".

It is appreciated that the contents of the LUTs 440 varies as a function of the reading apparatus to be employed. Preferably, a user of the processing apparatus is, therefore, provided with a "library" of LUT arrays 440, each array corresponding to an individual color reading device.

The output from LUT array 440 is received by a matrix multiplication unit 442 which receives matrix coefficient information from a coefficient storage unit and operates four respective functions, each typically comprising a linear combination of the four components of the pixel value, on each of the four respective components. For example, if it is desired to provide a cyan containing less magenta, the linear combination operated on the cyan component will have a negative magenta coefficient.

Preferably, the matrix of matrix multiplication unit 442 has the following properties:

The first column of the matrix describes the influence of the cyan input component on the output appearance of each of the other separations, the second column describes the influence of the magenta input component on the output appearance of each of the other separations, and the third and fourth columns do the same for yellow and black respectively. The first row of the matrix describes the influences of the four input components on the cyan output component and the second to fourth rows describe the influences of the four input components on the remaining three output components, respectively. Therefore, for example, the matrix coefficient in the second row, first column (M row, C column) represents the influence of the cyan input component on the magenta output component.

Some examples of 4×4 matrices suitable for processing CMYK pixels are as follows:

EXAMPLE 1

The four dimensional identity matrix $I_4$, which is employed if it is not desired to effect any transformations of the CMYK pixels. Similarly, it is noted that any of the LUTs of FIG. 36 may comprise the identity LUT if no transformation of the data is required by that LUT in a particular application.

EXAMPLE 2

A matrix for adding cyan to the magenta component of each pixel. This may be used, for example, if it is desired to provide a printed product which is similar to a reference printed product in which the magenta is "dirty" and contains some cyan:

$$\begin{matrix} 1 & 0 & 0 & 0 \\ 0.1 & 0.9 & 0 & 0 \\ 0 & 0 & 1 & 0 \\ 0 & 0 & 0 & 1 \end{matrix}$$

EXAMPLE 3

A matrix for removing cyan from the magenta component of each pixel. This may be used, for example, if the green (corresponding to magenta) filter of a color reading device has too wide a spectrum and, therefore, retains some unwanted red (corresponding to cyan):

$$\begin{matrix} 1 & 0 & 0 & 0 \\ -0.1 & 1.1 & 0 & 0 \\ 0 & 0 & 1 & 0 \\ 0 & 0 & 0 & 1 \end{matrix}$$

It is noted that, in examples 2 and 3, the first, third and fourth rows, corresponding to the influences of the four input components on the C, Y and K output components respectively, are the same as the corresponding rows of the identity matrix. This is because, in examples 2 and 3, it is not desired to change the appearances of the C, Y and K output components, but rather only the appearance of the M outputcomponent.

Similarly, in examples 2 and 3, the third and fourth columns are the same as the corresponding columns of the identity matrix. This is because, in examples 2 and 3, it is not desired to change the influence of the Y and K input components on the output appearance of each of the other separations. Only the influence of the C input component is of interest. No desired change in the influence of the M input component was specified; however, since is it advantageous to provide matrix coefficients which sum to 1 over each row, in order to preserve the gray scale balance, the M input component in the second row of both matrices is not the same as in the identity matrix, but rather is such as to provide a sum of 1 over the second row coefficients.

In other words, the only coefficients in the matrices of Examples 2 and 3 which differ from the corresponding coefficients of the identity matrix of Example 1 are:

a. the matrix coefficient in the second row, first column (M row, C column) which represents the influence of the cyan input component on the magenta output component; and b. the matrix coefficient in the second row, second column, which was changed to ensure a sum of one over the second row coefficients.

A preferred method for constructing the matrix 442 is as follows:

A. Provide an initial matrix 442, such as the four dimensional unity matrix.

B. Print cyan, magenta, yellow and black on the printer or output device.

C. Use the matrix 442 of step A to transform the four colors from B and then print the four colors from B, as calibrated, on a proofer.

D. Examine the two printed representations to determine whether the colored appearances thereof differ. If so, determine which separation is responsible for the difference and introduce a suitable change in the matrix. For example:

If the cyan contains more magenta in the print than in the proof, increase the value of the second row, first column position of the matrix. Conversely, if the cyan contains less magenta in the print than in the proof, decrease the same value.

E. Repeat step B–D until suitable accurate results are obtained.

The above method may be executed interactively using a MicroWhisper workstation, commercially available from Scitex Corporation, Herzlia, Israel.

4×4 matrix 442 may also be constructed using the TRANSCOL function or the TRANSBIP function, provided on the FYROX workstation, commercially available from Scitex Corporation, Herzlia, Israel.

Referring again to FIG. 29, the output of the matrix 442 is received by limiting means 444. The limiting means 444, typically comprising an array of 4 conventional limiters, is operative to ensure that the output pixel value falls within the limits of the number of bits used to store the pixel. For example, if 8 bits are used per component of the pixel, then each output component must have a value between 0 and 255. Preferably, the limiter trims the output of matrix 442 to the smallest number of bits upon which the remaining computations can be performed without loss of quality.

Typically, CMYK input and CMYK output to the apparatus of FIG. 29 is such that a value of 0, for any of the four components C, M, Y, K, corresponds to 100% dot and a value of 255 corresponds to 0% dot. However, the input to the matrix 442 is preferably inverted, so that the values of 0 and 255 correspond to 0% dot and 100% dot, respectively. The inversion of the input data is preferably performed by LUT array 440 prior to processing by matrix 442, and is then re-inverted by inverter array 446 after processing by matrix 442 and limiter array 444.

It is sometimes desirable that one or more of the output components not be linear combinations of the four input components. For example, it is sometimes desirable to "discard" the black component, and provide the required color in terms of the C, M and Y components only. Therefore, optionally, one or more of the output components may be defined as the product of a linear combination of the C, M, and Y components, times a multiple of the K component. Multiplication of the black component "into" the C, M and Y components is carried out by black multiplication array 448, comprising an array of three multiplying units corresponding to the C, M and Y data streams respectively.

For example, the output C coefficient, C*, might be computed as follows, the particular numerical coefficients having no particular significance but rather being intended to be illustrative of the form of the expression:

$$C^*=100-((100-(1.1\ C+0.1\ M-0.1\ Y))\ (100-0.95\ K))/100$$

instead of this way:

$$C^*=1.1\ C+0.1\ M-0.1\ Y+0.95\ K$$

where C, M, Y and K are in % dot units, i.e. the 0 . . . 100 range corresponds to the entire range from white to black.

"Discarding" the black component of the input color image data is required, for example, when the output device does not provide a black component. An example of such an output device is a CRT.

A particular advantage of employing black multiplication is that the "dimension" of the color image data is thereby reduced by 1 (for example, from 4 to 3 dimensions). Consequently, subsequent color processing by the elements of FIG. 29 which are "downstream" of the black multiplication unit will be 3 dimensional instead of 4 dimensional. As a result, the 4 dimensional LUT 452 may be replaced by a 3 dimensional LUT, which has the advantage of yielding better results for a given memory capacity.

It is appreciated that the present discussion pertains not only to black multiplication but more generally to the multiplying of any "masking" separation into other separations. A masking separation is one which, when printed on top of other colors, results in its own color rather than resulting in a combination of the other colors and its own.

A sample application which is particularly suited to black multiplication is when the CMYK input to the apparatus of FIG. 29 comprises digital instructions to a halftone output device such as an offset printer and the black component substantially masks out any components printed below it.

Preferably, the bypass structure is such as to allow the user of the apparatus the option of selecting either the "black multiplication" form of the functions or the "linear" form of the functions. This may be implemented by either of the following:

(a) providing a bypass over black multiplication unit 448, so that the data passes directly from the inverter 446 to 1D LUT 450; or (b) providing a bypass over inverter 446 and black multiplication unit 448, so that the data passes directly from limiter 444 to 1D LUT 450. In this case, since inverter 446 is inoperative, the LUT 450 is preferably operative to invert the color image data.

The output of black multiplication array 448 is received by 1D LUT array 450. The 1D LUT array 450 may be operative, preferably in conjunction with 4×4 matrix 442, to modify the image data, thereby to maximalize the effectiveness of the 4D LUT 452, as will be explained in detail below. If no adjustments are required, each LUT 450 may be an identity LUT. In applications where the inverter 446 is not operative, each LUT 450 may be employed as an inverting LUT by being loaded with the function $f(x)=255-x$.

Preferred methods for constructing 1D LUTs are described below with reference to FIGS. 20–34.

The output of 1D LUT array 450 is provided to 4D LUT 452 which is operative to perform transformations of the pixel value which depend simultaneously on all four components of the pixel. Preferred methods for constructing 4D LUTs 452 for a variety of purposes are disclosed in a coassigned Israel Patent Application, the disclosure of which is incorporated herein by reference. A copy of this document is appended hereto and is referenced Appendix C.

As explained in that document, a preferred method for constructing a 4D LUT 452 (or a 3D LUT 452) involves using a database or array of color patches. According to a preferred embodiment of the present invention, the array of color patches is printed by a proofer that was calibrated using a 1D LUT constructed in accordance with the second 1D LUT construction method described below with reference to FIGS. 30, 33 and 34. Further in accordance with a preferred embodiment of the present invention, the 4D LUT constructed using a particular 1D LUT is employed in conjunction with that 1D LUT which is copied into LUT 456 of FIG. 29.

The output of 4D LUT 452 is received by limiting means 454 which trims the output of LUT 452. The four components of the pixel output from limiting means 454 are received by an array 456 of 4 respectively corresponding 1D LUTs which may be operative to "linearize" the output device employed by adjusting for its particular characteristics. For example, if the color printing apparatus employed to read the output pixel is known to separate dark colors poorly, these colors must be "spread out". Alternatively or additionally, LUTs 456 are operative to "fit" the color values processed by the apparatus of FIG. 29, which color values may have been read from the output of a proofer, to the color values of the printer or other output device which is to be used to print the output of the color apparatus of FIG. 29. This process is referred to herein as calibration.

Preferred linearization and calibration methods are described in detail below.

It is appreciated that the structure of the LUTs 456 may vary as a function of the output apparatus employed. Preferably, a user of the processing apparatus of FIG. 29 is, therefore, provided with a "library" of LUT arrays 456, each array in the library corresponding to an individual color output device.

It is appreciated that the 1 dimensional LUTs of FIG. 29 may be employed to overcome one-dimensional non-linearities of any substantial magnitude, e.g. dot gain.

According to a preferred embodiment of the present invention, the elements of FIG. 29 which are "upstream" of 4D LUT 452 may serve to optimize the 4D LUT 452. In other words, the elements "upstream" of 4D LUT 452 may serve to modify the input data, thereby to provide data covering substantially the entirety of the input domain of the 4D LUT 452, thereby yielding better results for a given memory capacity.

For example: In a certain application, a CMYK representation of a color image is received in which each component is 8 bits. In other words, each pixel value comprises four 8 bit words. The four components of the address to the 4D LUT 452 are, respectively, the four MSB's of each word. The four LSB's of each word are employed to perform linear interpolation between the values stored in the 4D LUT.

The color image is such that the C component in the CMYK representation thereof varies only from 0 to 15 and never assumes any value in the 16–255 range. In other words, the MSB's of the C component of all of the pixels in the CMYK representation are identical. Therefore, the 4D LUT 452 is, practically speaking, inoperative for the data as received.

In consequence, it is preferred to "expand" the input data in order to optimally utilize the 4D LUT. In other words, the minimum C value, 0, will remain at 0, the maximum C value, 15, will be transformed to 255, and all intermediate values will be transformed so as to preserve linearity. This may be done in either of the following ways:

a. Constructing the 1D LUT 450 in accordance with the function $f(x)=255x/15$; or b. Constructing a matrix 442 which is identical to the identity matrix $I_4$ in all rows and columns except that the (1,1) element, corresponding to the influence of cyan on itself, is 255/15.

It is appreciated that the apparatus of FIG. 29 is an example of very general color processing apparatus having a wide variety of applications and uses, such as but no limited by the following:

a. Adaptation of color image data for a particular output device.

b. Modification of color image data received from a color reading device.

c. Transformation of color image input data in a first color space to a second color space.

d. Editing of a color image stored in a workstation.

Applications a–d of the color processing apparatus of FIG. 29 will now be discussed in detail:

a. Adaptation of color image data for a particular output device:

This application includes two possible cases:

1. Linearization of an output device, for at least one component of the color vector. A linearized output system for a particular component is a system in which there is a linear relationship between that component of the measured color or luminance of each pixel of a printed product and the value of that component of the corresponding pixels in the digital precursor of the printed product.

If the linear relationship is required for only a single component of the color vector, then only one component of the apparatus of FIG. 19 need be used. That component may be any of the 1D LUT arrays 440, 450 and 456.

A preferred method for constructing a linearization LUT is described below with reference to FIGS. 30, 33 and 34.

2. Calibrating the output device such that the printed products produced thereby will be substantially identical in appearance to the printed products produced by a reference output device.

To implement this, the components employed are at least multidimensional LUT 452, for the calibration process itself, limiter array 454 and, preferably, 1 D LUT 456, for linearizing the calibrated output device. In this case, the 1D LUT is a linearization LUT which may be constructed as described below with reference to FIGS. 30, 33 and 34.

Alternatively, a 1D LUT may be employed to perform the calibration process, instead of the 4D LUT 452. In this case, the 1D LUT is a "calibration" LUT, which may be constructed using the calibration LUT construction method described below with reference to FIGS. 30–32.

According to still another alternative, a 3 dimensional LUT 452 may be employed to calibrate three of the dimensions of a four dimensional data space and a 1 dimensional LUT may be employed to calibrate a fourth dimension of the data space, such as the black dimension. In this case, the C, M and Y components of the 1D LUT array 456 are preferably constructed using the linearization LUT construction procedure described below with reference to FIGS. 30, 33 and 34. The K component of the 1D LUT array is preferably constructed using the calibration LUT construction procedure described below with reference to FIGS. 30-32.

A preferred calibration method which employs all elements of FIG. 29 except for black multiplication unit 448 and LUT 450 in order to calibrate a particular output device such as a proofer with relative to a reference output device is as follows:

1. Construct a linearization LUT for the proofer, using the linearization LUT construction method described below with reference to FIGS. 30, 33 and 34.

2. Using the linearization LUT from step 1 as LUT 456, and bypassing the other elements of FIG. 29, employ the apparatus of FIG. 29 to plot a database useful for constructing a 4 dimensional LUT. Then construct the 4 dimensional LUT. Suitable databases and suitable multidimensional LUT construction methods, employing a reference output device, are described in Applicant's coassigned Israel patent Application, appended hereto and referenced Appendix C.

Load the resulting 4 dimensional LUT into LUT 452 of FIG. 29.

3. Select a test color image and print it, using the proofer in conjunction with the apparatus of FIG. 29. In this step, the elements "upstream" of multidimensional LUT 452 are bypassed and 4D LUT 452, limiters 454 and 1D LUT array 456 are operative.

4. Examine or scan the printed representation of the color image and construct matrix 442 so as to overcome any discrepancies between the actual appearance of the color image and the desired appearance thereof.

5. Construct a calibration LUT, using the calibration LUT construction method described below with reference to FIGS. 30–32. In step F of that method, in which a digital representation is printed using the output device to be calibrated, use the proofer in conjunction with all elements of FIG .29 downstream of and inclusive of matrix 442 to print the digital representation. In step B of that method, in which a digital representation is printed using a printer, use the reference output device to print the digital representation.

Alternatively, the calibration LUT may be constructed using the DRANGE function provided on the FYROX workstation, commercially available from Scitex Corporation, Herzlia, Israel. Use of the DRANGE function is particularly suited to applications in which accuracy of the gray scale is important.

6. Load the 1D LUT 440 with the calibration LUT constructed in step 5. The proofer in conjunction with all elements of FIG. 29 is now calibrated with reference to the reference device.

Figure 61:
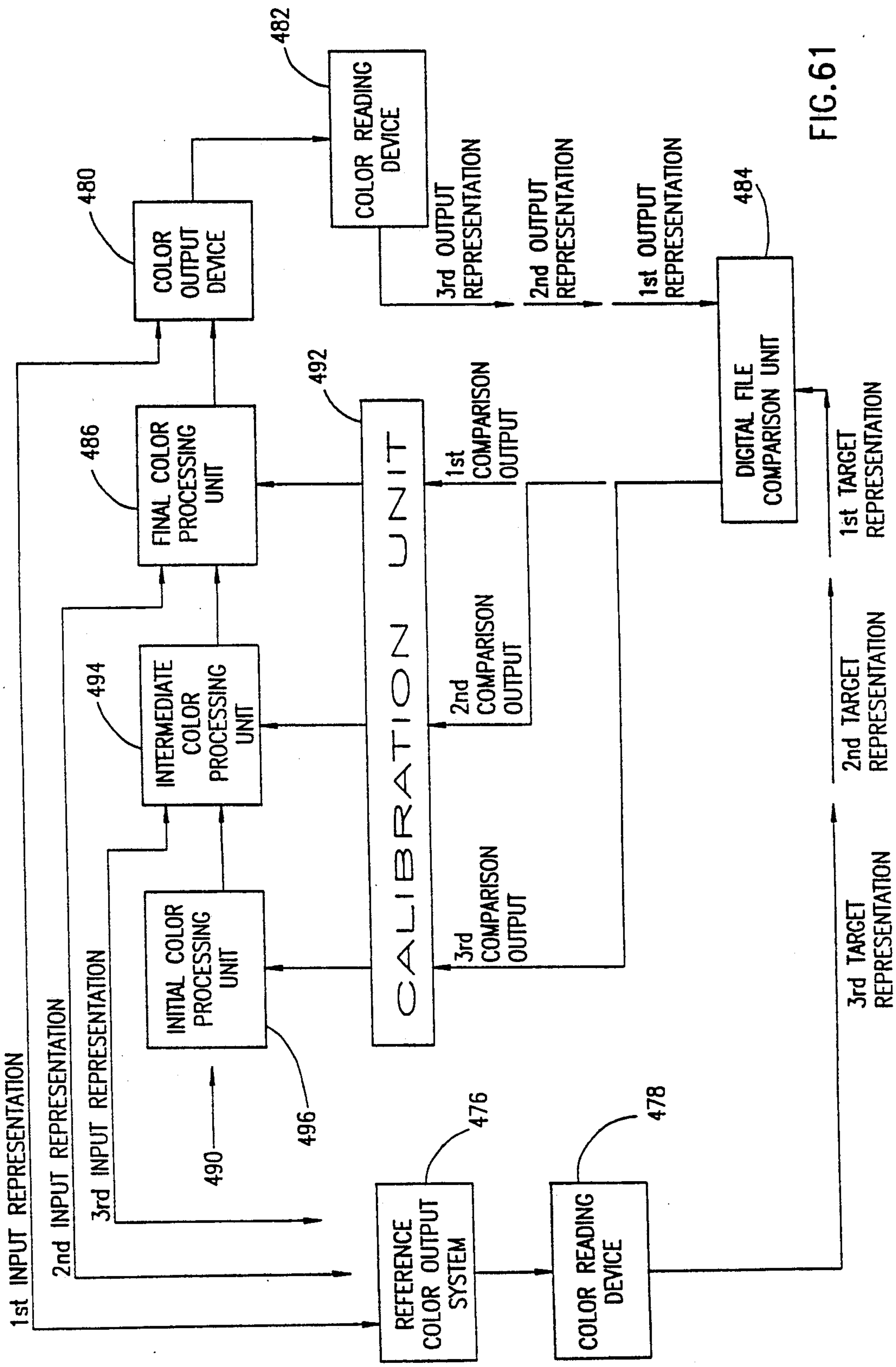
FIG. 61 is a schematic block diagram illustrating apparatus for calibrating a pipelined color processing device and a method for utilizing the apparatus.

The above calibration method and apparatus suitable therefor is illustrated more generally, in schematic block diagram form, in FIG. 61.

The method of FIG. 61 preferably comprises the following steps:

a. Providing a first target representation of a first reference color image. For example, the first target representation may be provided by processing a first input representation of a first reference color image using a reference color processing device 476. In the embodiment of FIG. 61, the first input representation comprises a digital representation, the reference color processing device 476 comprises a color output system, a color reading device 478 is provided downstream thereof, and the first target representation comprises a digital representation.

Similarly, second and third target representations of respective second and third reference color images are provided, as by respectively processing second and third input representations of the second and third reference color images respectively.

b. Processing the first input representation using a color output device 480 and a color reading device 482 downstream thereof, thereby to define a first output representation of the first reference color image, c. Comparing the first target and first output representations, using a comparison unit 484. The output generated by the comparison unit 484 in this step is termed the "first comparison output".

d. Calibrating a final color processing unit 486 in a pipeline 490, in accordance with the first comparison output, using a calibration unit 492.

e. Processing the second input representation using a pipeline comprising the calibrated final color processing unit 486 as well as, in the illustrated embodiment, color output device 480 and color reading device 482, thereby to define a second output representation of the second reference color image.

f. Comparing the second target and second output representations, using comparison unit 484. The output generated by comparison unit 484 in this step is termed the "second comparison output".

g. Calibrating an intermediate color processing unit 494 in pipeline 490, in accordance with the second comparison output, using calibration unit 492.

h. Processing the third input representation using a pipeline comprising the calibrated intermediate and final color processing units 494 and 486 as well as, in the illustrated embodiment, color output device 480 and color reading device 482, thereby to define a third output representation of the third reference color image.

i. Comparing the third target and third output representations, using comparison unit 484. The output generated by comparison unit 484 in this step is termed the "third comparison output".

j. Calibrating an initial color processing unit 496 in pipeline 490, in accordance with the third comparison output, using calibration unit 492.

b. Modification of color image data received from a color reading device.

The color image data received from the color reading device is generally RGB data. The RGB data which is obtained by scanning a particular analog representation of a color image will vary as a function of the color reading device employed. Therefore, it is desirable to modify the RGB data, in order to obtain "uniform" RGB data, i.e., RGB data which does not reflect the particular characteristics of the color reading device employed to provide that data.

The uniformization of the RGB data is preferably implemented by employing matrix 442. In other words, a matrix 442 is constructed for each color reading device from which input is accepted and desired to be uniformized.

Additionally, it may be desirable to linearize each of the three components of the RGB data. This may be done by using an analytic formula, e.g. by raising each component to a particular power such as 0.45. However, according to a preferred embodiment of the present invention, the linearization may be implemented by passing the data through a "power-raising" LUT, i.e. a LUT, such as 1D LUT 440, which is constructed and operative to raise the power of the data passing therethrough.

c. Transformation of color image input data is a first color space to a second color space.

A sample color transformation is described in a document produced by the Society of Motion Picture and Television Engineers entitled "SMPTE Standard for television: signal parameters: 1125/60 high-definition production system" and referenced SMPTE 240M, 1988.

If the transformation of the first color space to the second color space is a one dimensional transformation defined by a known analytical formula, then the 1D LUT 440 may be constructed in accordance with that formula. The 1D LUT 440 is subsequently employed to implement the transformation.

If the transformation of the first color space to the second color space is a linear transformation defined by a known matrix, then hat matrix may be loaded into matrix 442 and matrix 442 may be employed to implement the transformation.

It is appreciated that some transformations may be effected by use of a 1D LUT array in conjunction with a matrix. For example, 1D LUT array 440 and matrix 442 may be used to effect a power function and to subsequently perform a four dimensional linear transformation. Matrix 442 and 1D LUT 450 may also be used to first effect a transformation consisting of performing a four dimensional linear transformation and subsequently to raise the transformed data to a certain power.

Alternatively, any transformation, including a transformation for which no analytical formula is known, may be effected by constructing a 4D LUT as described in a coassigned Israel Patent Application appended herein as Appendix C, and copying that LUT into 4D LUT 452 of FIG. 29.

d. Editing of a color image stored in a workstation:

One editing application is as follows:

In certain workstations such as the MicroWhisper, commercially available from Scitex Corporation, Herzlia, Israel, modifications are made by the user on a 1D LUT, termed the "gradation" LUT, rather than on the stored digital representation of the color image. The analog representation of the color image appearing on the workstation screen is provided by passing the digital representation of the color image through the 1D gradation LUT. When the user is satisfied with the appearance of the color image on the screen, the final form of the 1D gradation LUT is operated on the stored digital representation of the color image, thereby to provide a modified digital representation of the color image.

The LUT operation step may be implemented using the apparatus of FIG. 29 by copying the final gradation LUT onto 1D LUT 440 of FIG. 29 and passing the digital representation of the color image through LUT 440.

It is appreciated that some applications for which the apparatus of FIG. 29 is useful may be a combination of applications a–d discussed above. For example, a digital file stored in a workstation may be edited, and the edited gradation LUT may be copied onto LUT 440. It may then be desired to transform digital data exiting LUT 440, thereby to obtain digital data in a different color space. This may be done by using the following suitably constructed element: matrix 442, limiter array 444, inverter array 446 and 1D LUT 450. Finally, it is desired to output the resulting digital data on a color output device which is to be calibrated with reference to a reference color output device. This may be done by using the following suitable constructed elements: multidimensional LUT 452, limiter 454 and 1D LUT 456.

Figure 30:
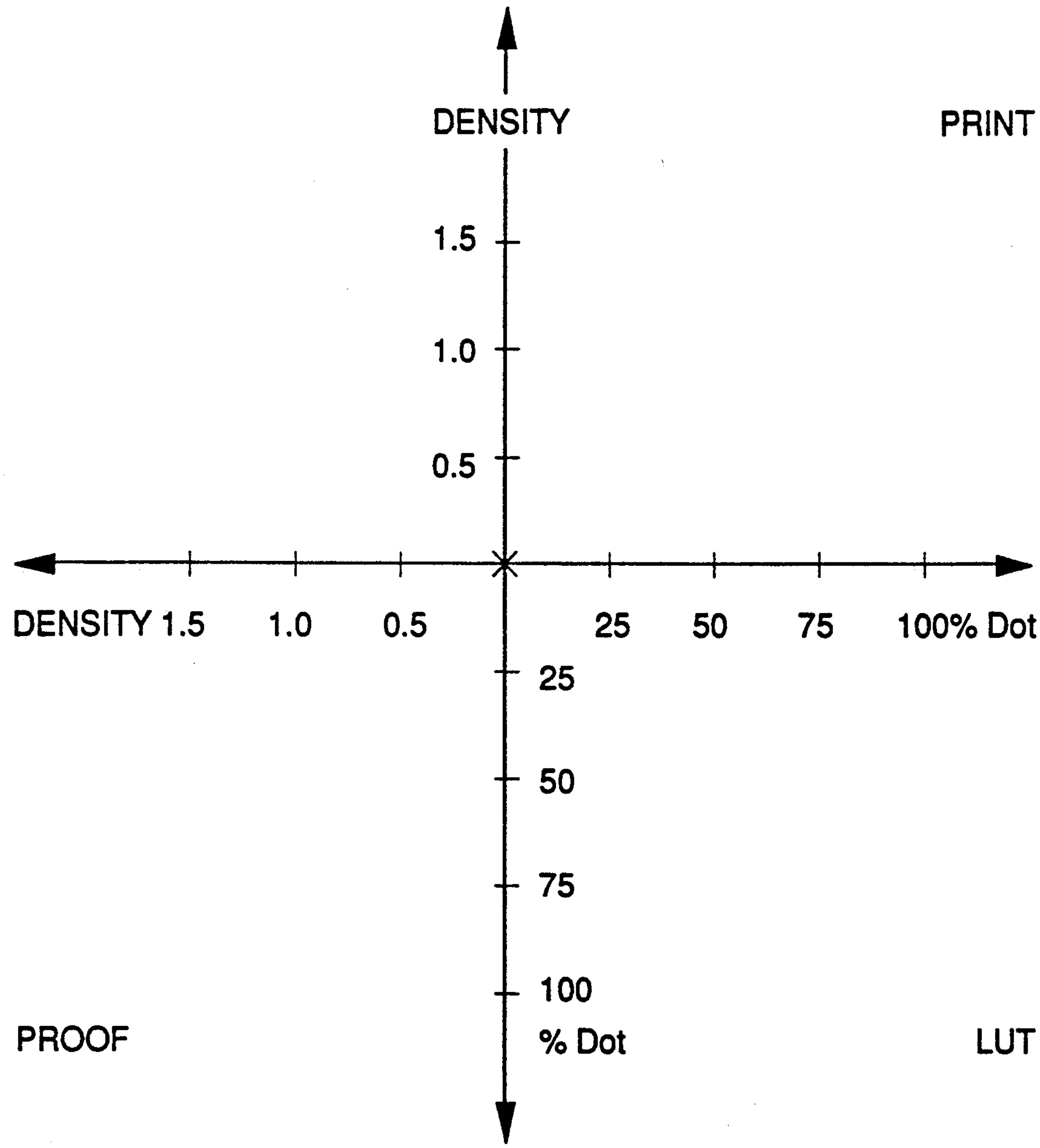
FIGS. 30–32 illustrate a first preferred method for constructing a 1 dimensional LUT useful for calibration of an output device relative to a reference device.
Figure 31:
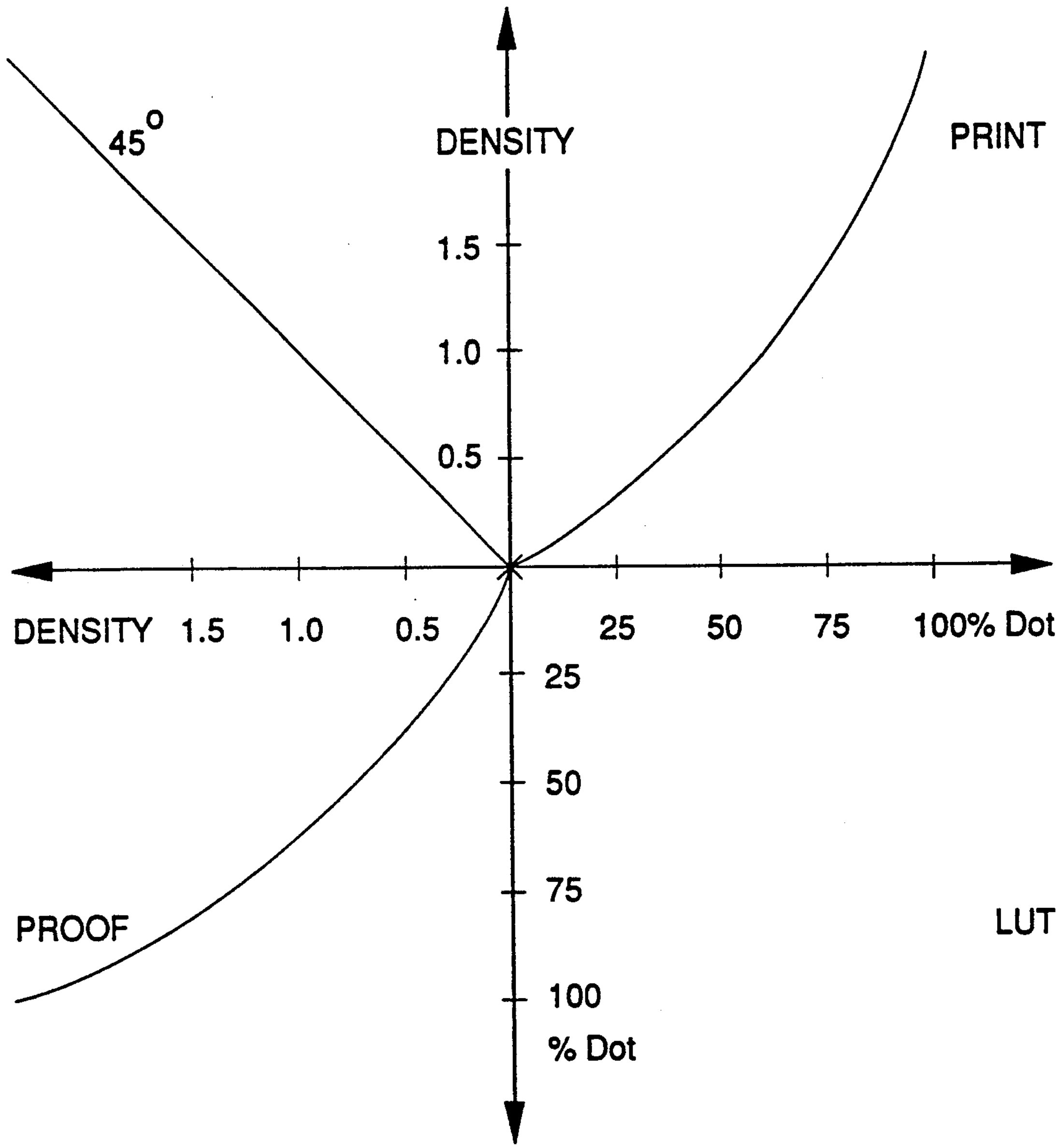
Figure 32:
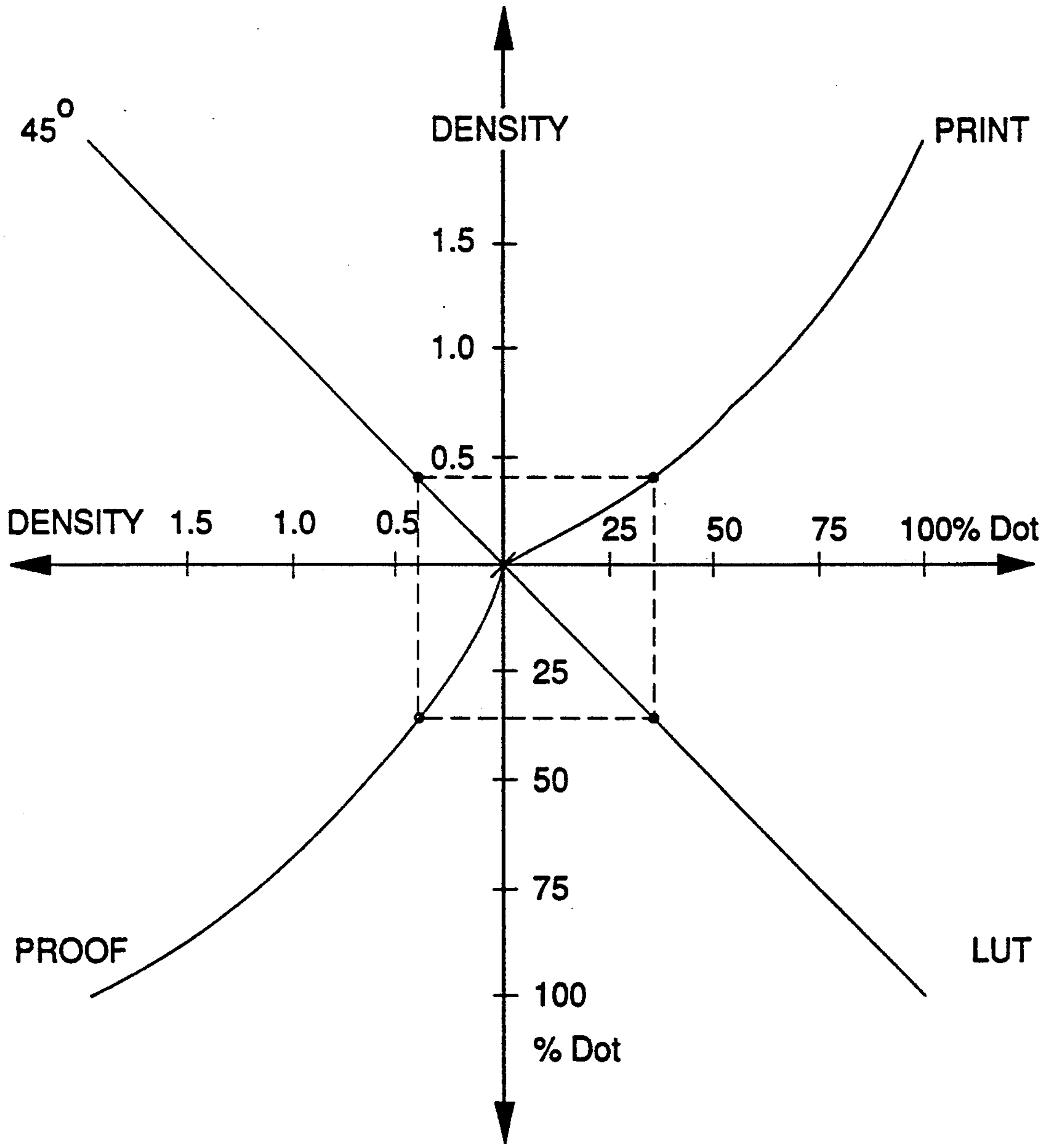

Reference is now made to FIGS. 30–32 which illustrate a method for constructing a 1 dimensional LUT useful for calibration of an output device relative to a reference device. As explained above, the function of the 1 D constructed in accordance with the method of FIGS. 30–32 is to "fit" the color values of the proofer used to provide an analog precursor of the digital data processed by the apparatus of FIG. 29, to the color values of a printer which it is desired to employ to print the digital data processed by the apparatus of FIG. 29.

In other words, a 1 dimensional LUT may be constructed which receives a first digital representation derived from an analog representation of a color image produced on a proofer and modifies it, thereby to define a second digital representation, such that the second digital representation, when received by the proofer, will provide an analog representation substantially identical in appearance to the analog representation which would result from printing the first digital representation of the color image on the printer.

The method preferably comprises the following steps, which are performed for each separation or color component:

A. Provide a digital representation of an image in which the color values of the separation increase or decrease monotonically along one of the dimensions of the separation in accordance with a predetermined pattern or rule. The variation in color may be either continuous or discrete. The dot-percent value at each location of the image is known.

A sample digital representation having the above characteristics is the following $17 \times 5$ pixel array, where each pixel is given in CMY values from 0 to 255:

```
255 255 255; 255 255 255; 255 255 255; 255 255 255; 255 255 255;
240 255 255; 255 255 255; 255 240 255; 255 255 255; 255 255 240;
224 255 255; 255 255 255; 255 224 255; 255 255 255; 255 255 224;
208 255 255; 255 255 255; 255 208 255; 255 255 255; 255 255 208;
192 255 255; 255 255 255; 255 192 255; 255 255 255; 255 255 192;
176 255 255; 255 255 255; 255 176 255; 255 255 255; 255 255 176;
160 255 255; 255 255 255; 255 160 255; 255 255 255; 255 255 160;
144 255 255; 255 255 255; 255 144 255; 255 255 255; 255 255 144;
128 255 255; 255 255 255; 255 128 255; 255 255 255; 255 255 128;
112 255 255; 255 255 255; 255 112 255; 255 255 255; 255 255 112;
 96 255 255; 255 255 255; 255  96 255; 255 255 255; 255 255  96;
 80 255 255; 255 255 255; 255  80 255; 255 255 255; 255 255  80;
 64 255 255; 255 255 255; 255  64 255; 255 255 255; 255 255  64;
 48 255 255; 255 255 255; 255  40 255; 255 255 255; 255 255  40;
 32 255 255; 255 255 255; 255  32 255; 255 255 255; 255 255  32;
 16 255 255; 255 255 255; 255  16 255; 255 255 255; 255 255  16;
  0 255 255; 255 255 255; 255   0 255; 255 255 255; 255 255   0;
```

As seen, the cyan component of the first column of pixels changes from 255, or 0% dot, to 0, or 100% dot. The magenta and yellow components of the first column of pixels are both always white.

All three components of the second column of pixels are white (255 or 0% dot).

In the third column of pixels, the magenta component changes from 255, or 0% dot, to 0, or 100% dot. The cyan and yellow components of the third column of pixels are both always white.

All three components of the fourth column of pixels are white (255 or 0% dot).

In the fifth column of pixels, the yellow component changes from 255, or 0% dot, to 0, or 100% dot. The cyan and magenta components of the fifth column of pixels are both always white.

The appearance of an analog representation of the above digital information is a color image comprising a first cyan vertical line which is lightest at the top and darkens as it descends, a second magenta vertical line which is lightest at the top and darkens as it descends and a third yellow vertical line which is lightest at the top and darkens as it descends. In between the three colored lines there are white vertical lines.

It is noted that the gradations of the cyan component in the first column, the magenta component in the third column and the yellow component in the fifth column are linear. In other words, the difference between the relevant component of adjacent pixels in each column is uniform (16, in the present example). However, if an analog representation of the data is produced on a color output device and subsequently read by a color reading device such as a scanner, the resulting scanner color values will generally not be completely linear. This is due, inter alia, to irregularities of the color output device. For the same reason, if first and second analog representations of the data are produced on respective first and second color output devices and both representations are subsequently read by a color reading device such as a scanner, the resulting first and second sets of scanner color values will generally not be identical to one another.

B. Print the digital representation provided by step A, using the printer.

C. Select a plurality of points, typically at least 20, which are preferably evenly distributed over the printed image, and measure the density of each point with a densitometer.

D. Plot the plurality of points from C in the upper right hand quadrant of a graph in which:

i. the dot-percent values of each of the plurality of points is represented along the positive portion of the X axis (values may range from 0 to 100% dot);

ii. the density of each point, as measured in step C, is represented along the positive portion of the Y axis (values may range from 0 to 3.0);

A typical graph is shown in FIG. 30. The upper right hand quadrant is used to represent information regarding the characteristics of the printer. The lower left hand quadrant is used to represent information regarding characteristics of the proofer.

Draw a smooth curve between the points as plotted on the graph.

E. Draw the $y=-x$ curve in the upper left hand quadrant of the graph, i.e. a line oriented 45 degrees clockwise from the horizontal.

F. Print the digital representation of the image on the proofer, then

G. Plot the plurality of points form F in the lower lefthand quadrant of the graph such that:

i. the dot-percent values of each of the plurality of points are represented along the negative portion of the Y axis (values may range from 0 to 100% dot);

ii. the density of each point, as measured is step C, is represented along the negative portion of the X axis (values may range from 0 to 3.0);

Draw a smooth curve between the plotted points.

FIG. 31 illustrates the graph after step G has been completed.

H. Select a plurality of points along the $y=-x$ line, preferably at least 20.

I. For each of the points in H;

i. Join the point to the curve of step G with a vertical line.

ii. At the meeting point of the curve and the vertical line, draw a horizontal line extending to the right.

iii. Join the point to the curve of step D with a horizontal line.

iv. At the meeting point of the curve and the horizontal line, draw a vertical line downward, joining the meeting point to the horizontal line of substep iii. Mark the point P at which the vertical line meets the horizontal line of substep iii.

FIG. 32 illustrates the graph after step I has been completed.

J. Draw a curve through all points P.

K. Convert the curve into a LUT. This step may be effected using a commercially available device such as the MicroWhisper, commercially available from Scitex Corporation, Herzlia, Israel.

A method for constructing a 1D LUT useful for output device linearization is now described.

As explained above, it is generally the case that equal gradations of a particular component, when printed and scanned, will no longer be equal. In other words, color outputting and reading processes cause "distortion" of the colored appearance of color images. A 1 dimensional LUT may be employed to "linearize" the output of a color output device.

A preferred method of constructing a 1D LUT operative to linearize the output of a color output device comprises the steps A-K of the method described above with reference to FIGS. 30-32, with the following modification:

In step C, the plurality of points preferably includes a point corresponding to the maximum density, i.e. the proofer's reading at 100% dot, and a point corresponding to the minimum density, i.e. the proofer's reading at 0% dot.

In step D, the plurality of points are plotted in the lower left hand quadrant, rather than in the upper right hand quadrant. Referring to FIG. 30, the upper right hand quadrant now represents the desired linear relationship between the % dot and the dimension. The lower left hand hand quadrant now represents the characteristics of the proofer.

Steps F and G are replaced by the step of plotting a straight line between the proofer's minimum reading, i.e. the proofer's reading at 0% dot, and between the proofer's maximum reading, i.e. the proofer's reading at 100% dot. The resulting straight line replaces the "curve of step G" referred to in step I.

Figure 33:
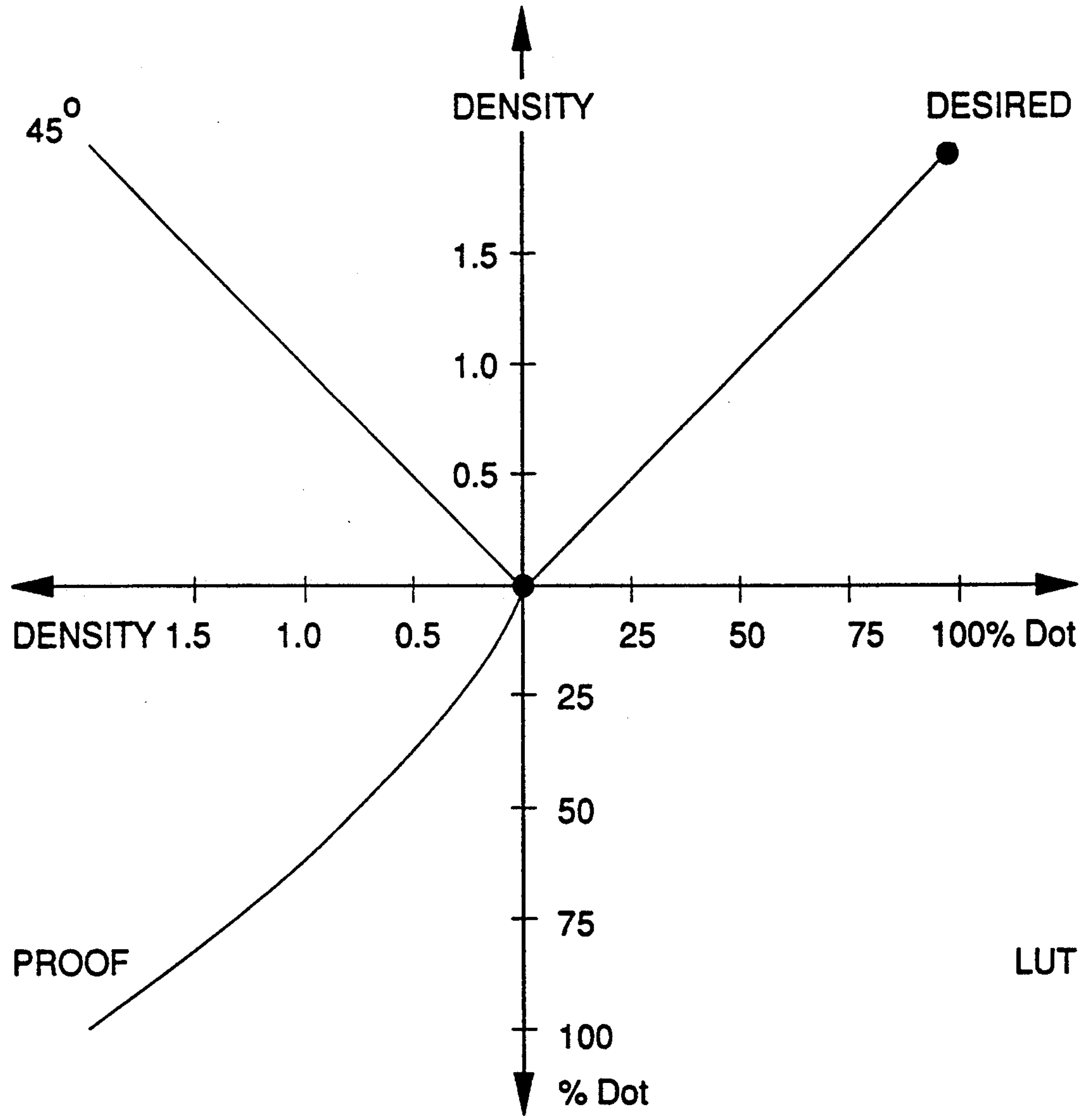
FIGS. 33–34 illustrate a second preferred method for constructing a 1 dimensional LUT useful for linearization of an output device.

FIG. 33 illustrates the graph after this plotting step has been completed.

Figure 34:
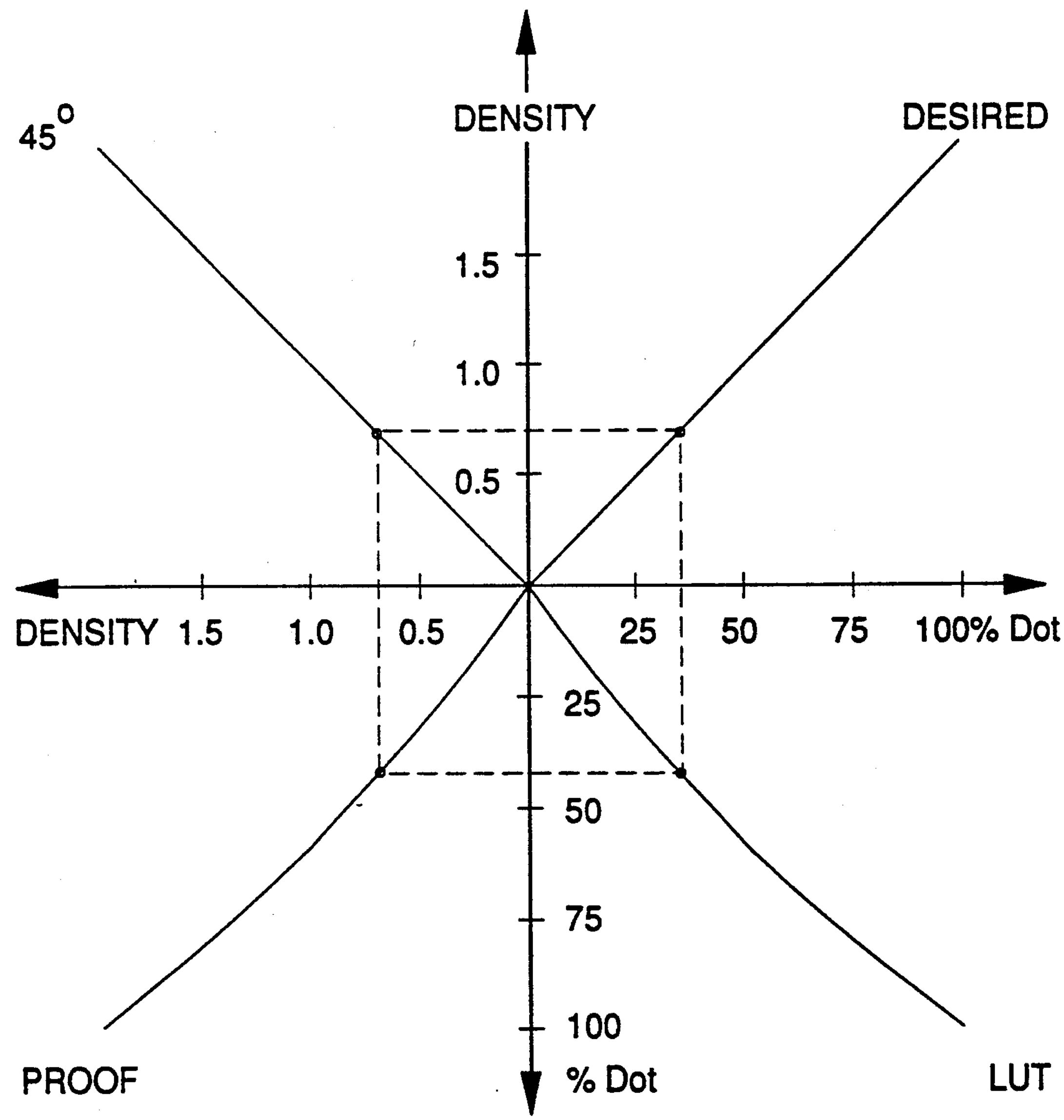

FIG. 34 illustrates the graph after step I has been completed.

Figure 35:
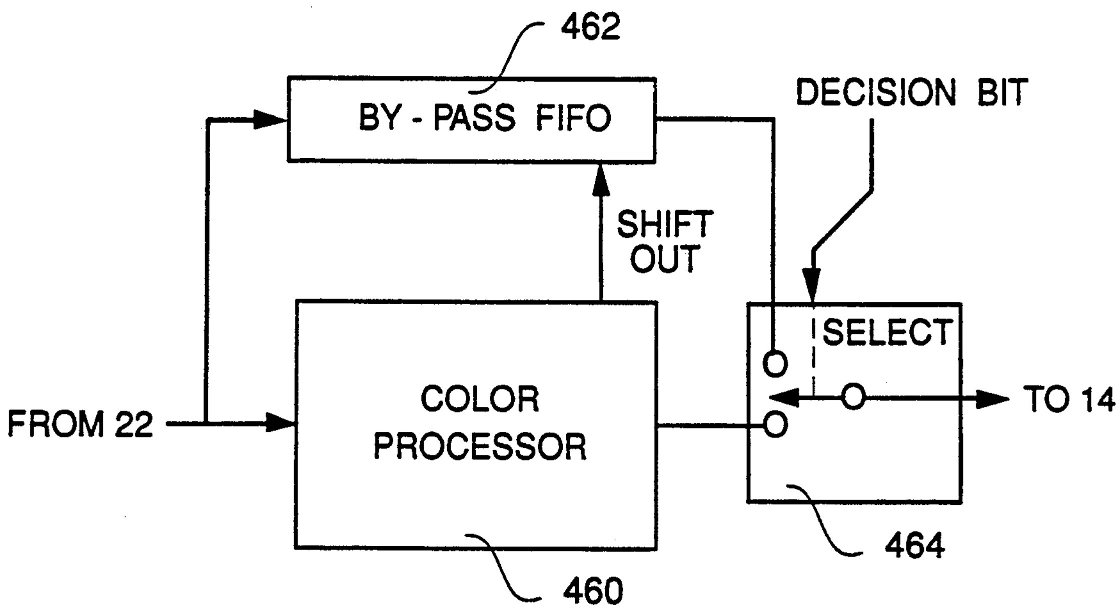
FIG. 35 is a block diagram of color image processing apparatus for color processing of a digital representation of an image.

Reference is now made to FIG. 35, which is a block diagram of color image processing apparatus for color processing of a digital representation of an image. The color processing apparatus of FIG. 35 is a further preferred embodiment of a color processing unit such as color unit 12 of FIG. 1 or color unit 1014 of FIG. 41. A particular feature of the color processing apparatus of FIG. 35 is that it is selectively operable. In some applications, it may be desirable to perform color transformations on only some of the color components of the color image, for example, only on the C and M components and not on the Y and K components. Alternatively or in addition, it may be desirable to perform color transformations on only some of the area of the color image, instead of one the entire area thereof.

As shown in FIG. 35, the color processing apparatus preferably comprises a color processing unit 460 which may include some or preferably all of the elements illustrated in FIG. 29; a FIFO buffer 462 which enables the original input data, in addition to the transformed output data, to be available; and selection means 464 for selecting either the original input data or the transformed output data in accordance with a decision bit.

A preferred mode of operation of the apparatus of FIG. 35 is as follows: a stream of pixels is received by the by-pass FIFO 462 and by the color processor 460. Each pixel is modified by color processor 460 and is later provided to the selector 464 at time intervals which may not be fixed and which may not be known. However, it is known that the operation of color processor 460 is "first in first out". In other words, if pixel A precedes pixel B on its way into color processor 460, then pixel A will precede pixel B on its way into selector 464.

Therefore, the preferred means for storing the original input pixels is a "first in first out" storage unit. This allows each original pixel to be shifted out of the "first in first out" storage unit 462 when an appropriate shift-out signal arrives from color processor 460, indicating that the corresponding modified pixel is now being shifted out of color processor 460.

It is appreciated that the apparatus of FIG. 35 provides "automatic" synchronization of the processed input data and the original input data. In other words, the processed input data and the original input data arrive at the selector 464 simultaneously without keeping track of the delay introduced by color processor 460, which may vary from pixel to pixel and from component to component of the same pixel.

It is appreciated that the automatic synchronization function provided by the apparatus of FIG. 35 is useful in a variety of data processing application. In other words, the color processor 460 of FIG. 35 may e replaced by any suitable data processing unit for which the order of outcoming data elements is the same as the order of incoming data elements.

Figure 36:
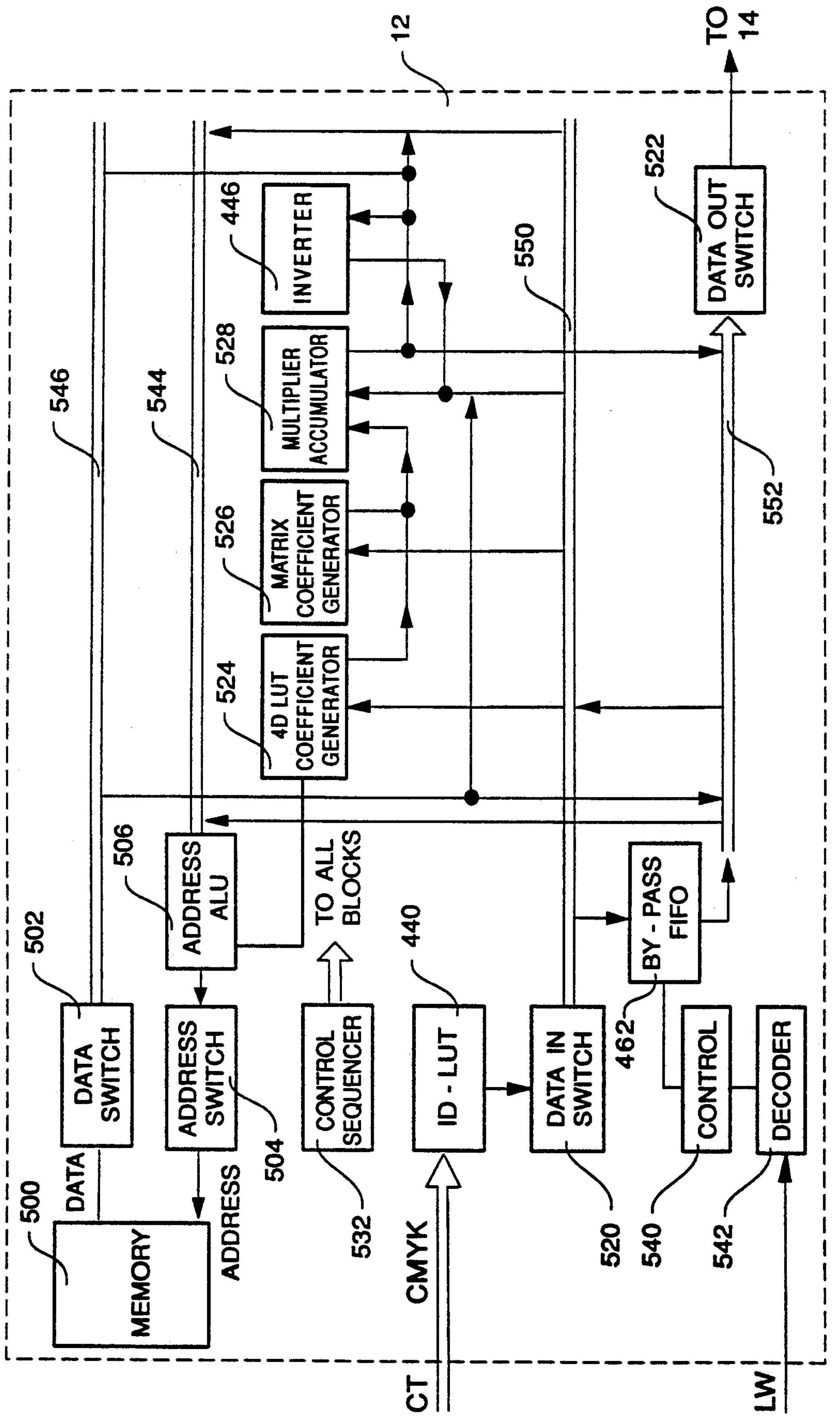
FIG. 36 is a block diagram illustrating a preferred hardware implementation of apparatus of FIG. 35.

Reference is now made to FIG. 36, which is a block diagram illustrating a preferred hardware implementation of selectively operable color processing apparatus including a bypass unit (referenced 462 to correspond to the bypass unit of FIG. 35) and a color processor. In the embodiment of FIG. 36, the color processor includes all components illustrated in FIG. 29.

A memory 500 stores LUTs 450, 452 and 456 of FIG. 29. A data switch 502 and an address switch 504 which interface memory 500 provide address routing and preferably maximalize utilization of memory 500 by compacting it. Address switch 504 is associated with an address ALU 506. Data input and output switches 520 and 522 respectively interface to the data stream, which, in the illustrated embodiment, comprises a stream of 12-bit CT data, although the applicability of the apparatus is not limited to this example. A conventional storage device storing LUT 440 interfaces with data in switch 520. Data input switch 520 may be implemented based upon registers such as Philips' 74374 and is strobed by a signal arriving from control sequencer 532 (see below).

A 4D LUT coefficient generator 524 generates coefficients for 4D LUT 452 of FIG. 29. A matrix/black coefficient generator 526 generates coefficients for the matrix 442 and for black multipliers 448 of FIG. 29. A multiplier/accumulator array 528 comprises a plurality of multiply/accumulator units, each comprising a multiplier and an adder. The number of multiply/add units corresponds to the number of separations, and the plurality of multiply/add units preferably work in parallel on the respective separations.

A controller/sequencer 532 interfaces with all major components of FIG. 36 and is operative to control the operation of the apparatus of FIG. 36, and in particular, to implement a user-selected bypass and exit structure, as explained above with reference to FIG. 29.

In accordance with a preferred embodiment of the present invention, the LW representation of a color image also includes user-determined information as to which locations and/or which separations are to be processed and which are to be left unchanged. The LW representation may then be employed to determine the decision bit of FIG. 35.

Bypass FIFO 462 receives a decision bit from a control unit 540 which preferably receives the LW data stream via a decoder 542. It is appreciated that the decoder 542 may be implemented by conventional means, depending on the exact type of LW or other run length encoded data employed. Alternatively, the control unit 540 may be programmed to bypass one or more separations.

Bypass FIFO 462 may be based upon the integrated circuit known as CY7C408, commercially available from Cypress Semiconductors, San Jose, Calif., USA. Since this circuit handles only 8 bits, two FIFOs may be provided, in parallel, to fit input and output busses of 12 bits each. Preferably, 8 bits are handled by the first FIFO and the remaining four bits are handled by the second FIFO. The components also receive control signals such as shift-in, shift-out, and reset, from control sequencer 532 and control unit 540 of FIG. 36.

Data switch 502 is operative to select which of four separations supplied by memory 500 will be passed to internal data bus 546 (see below). Typically, one or all four separations are passed on. The selection is in accordance with signals arriving from control sequencer 532. Switch 502 may be based upon the 74F153, commercially available from Philips.

Data out switch 522 preferably comprises a plurality of registers such as 74F374, commercially available from Philips, which are strobed by a data strobe arriving from control sequencer 532.

The coefficient generator 526 preferably comprises a memory having a four word capacity, each word comprising four 13-bit fields. This may be implemented using five 82S09 chips from Philips. Coefficient generator 526 is operative to store the coefficients of matrix 442 of FIG. 29.

Control sequencer 532 is operative to control the operations of all units of FIG. 36. Each unit of FIG. 36 is preferably controlled by an internal state machine (not shown) which may be based upon a PAL such as an AMD 22V10. Each state machine operates the corresponding unit exactly once, upon receipt of a control signal from control sequencer 532, which operates as a "master state machine". Upon completion of the operation of each operating unit, the state machine corresponding thereto provides a suitable termination signal to control sequencer 532 which then sends a control signal to whichever unit of FIG. 36 is to operate next. Sequencer 532 may be based upon a plurality of PALs, such as the AMD 22V10.

Preferably, an internal address bus 544 and an internal data bus 546, as well as an input bus 550 and an output bus 552, are provided which allow all units to work in parallel by allowing parallel data transfer.

A preferred mode of operation of the apparatus of FIG. 36 is now described. CT data arrives at 1D LUT storage device 440. The CT data as transformed by 1D LUT 440 is carried onto input bus 550 via data in switch 520, which is in a first, new data input position. The CT data next arrives at multiplier/accumulator unit 528 where the operations of matrix 442 multiplication and limiting are carried out, using the matrix 442 coefficients which arrive from coefficient generator 526. The C, M and Y components of the data are then provided to inverter 446 which inverts the system value data, thereby to provide %dot data for those components.

The inverted data returns to the multiplier/accumulator unit 528 where the black multiplication operation is carried out. The black multiplication coefficients arrive from coefficient generator 526. The data is shifted onto output bus 552. Data out switch 522 is in a first, no data out position and the data arrives at address ALU 506 which is enabled to receive it by control sequencer 532.

Black multiplier array 448 of FIG. 29 is implemented as follows: All four separations are preferably inverted by inverter 446 and the C, M and Y separations are multiplied by the black.

Address ALU 506, in conjunction with address switch 504, compute the address of 1D LUT 450 which is stored in memory 500 and access memory 500. The accessed information from memory 500 arrives at output bus 552. Alternatively, the address to LUT 450 may be provided by the multiplier array 528 which performs the matrix multiplication.

The data out switch 522 is still in its no data out position, so the data arrives at coefficient generator 524 which selects interpolation coefficients, using the LSB's of the data, and provides them to multiplier/accumulator unit 528.

Address ALU 506 and address switch 504 together access memory 500 which stores 4D LUT 452. The address ALU 506 uses the MSB's to access the 4D LUT 452. The accessed contents of 4D LUT 452 arrive at multiplier/accumulator unit 528.

Multiplier/accumulator unit 528 interpolates an output value by multiplying each interpolation coefficient by the corresponding accessed data from 4D LUT 452, thereby to obtain a product, and then adding the products and "limiting" the result.

The final output of multiplier/accumulator unit 528 arrives, via output bus 552 and address bus 544, at address ALU 506. Address ALU 506, in conjunction with address switch 504, accesses LUT 456 which is stored in memory 500. Once transformed by the LUT 456, the data exits through data switch 502, data bus 546 and output bus 552. Control sequencer 532 causes data out switch 522 to assume its second data out position and the data is shifted out of the color processing unit.

Apparatus and methods for color processing using a four dimensional LUT such as LUT 452 are described in the following United States Patents, the disclosures of which are incorporated herein by reference: U.S. Pat. No. 4,500,919 to Schrieber, U.S. Pat. No. 4,477,833 to Clark et al; U.S. Pat. No. 4,511,989 to Sakamoto.

It is preferable to use 17 points along each of the four dimensions of the LUT 452, thereby to facilitate interpolation in the 16th interval. Specifically, a preferred method for interpolating for pixels having at least one color component falling with the 240–255 interval is by using the 17th point, 256, defined along the axis corresponding to that component. State of the art technology generally divides the 0 . . . 255 bit range along each LUT dimension to $2^n$ segments, where n is some integer such as 4. In accordance with a preferred embodiment of the present invention, in order to partition each LUT dimension into $2^n$ segments, $2^n+1$ points are defined, i.e. including both ends of the range. Therefore, the LUT 452 preferably comprises 17 not 16 entries or points per dimension.

A particular features of the apparatus of FIG. 36 is that a plurality of separations may be processed in parallel. This feature is provided due to the provision of input busses 550 and 544 and output bus 552, and due to the factor that the multiplier/accumulator array 528 includes a plurality of multipliers which correspond in number to the number of separations to be processed.

A further particular feature of the embodiment of FIG. 36 is that the multipliers, which may contain a very large number of gates, are utilized in the implementation of a plurality of or all of the following components of FIG. 29: 4×4 matrix 442, black multiplication unit 48, and interpolations for LUT 452. The advantage of this feature is that it allows generally continuous operation of the multipliers during color processing rather than intermittent operation thereof.

A further particular feature of the apparatus of FIG. 36 is the provision of address switch 504 which allows efficient use of only a relatively small and compact portion of memory in applications where only a relatively small amount of memory is required. This is done by storing substantially the entirety of the body of information to be stored in a single area of the memory thereby enabling a very large proportion of the memory to be utilized.

Processing speed of the apparatus of FIG. 36 may be increased as follows:

Preferably, pipelining techniques are employed, thereby allowing some of the operations carried out by the components of FIG. 36 to be carried out in parallel. For example, the matrix multiplication carried out by multiplying means 528 may be carried out simultaneously with the table look up operation carried out in memory 500. Pipelining may result in a relative fast information processing rate, such as one pixel per clock.

According to a preferred embodiment, a plurality of devices such as the device shown and illustrated in FIG. 36 may be provided. The devices may be mutually cascaded. For example, two mutually cascaded devices may be provided. The first device may perform the operation of matrix 442 and the second device may perform the operation of the 4 dimensional LUT 452.

Further in accordance with a preferred embodiment of the present invention, a plurality of devices such as the device illustrated in FIG. 36 may be provided for operation in parallel. For example, a first device or a first plurality of mutually cascaded devices may process odd addressed pixels whereas a second device or second plurality of mutually cascaded devices may process even addressed pixels.

The above two methods of increasing processing speed may be used separately or in combination.

Figure 37:
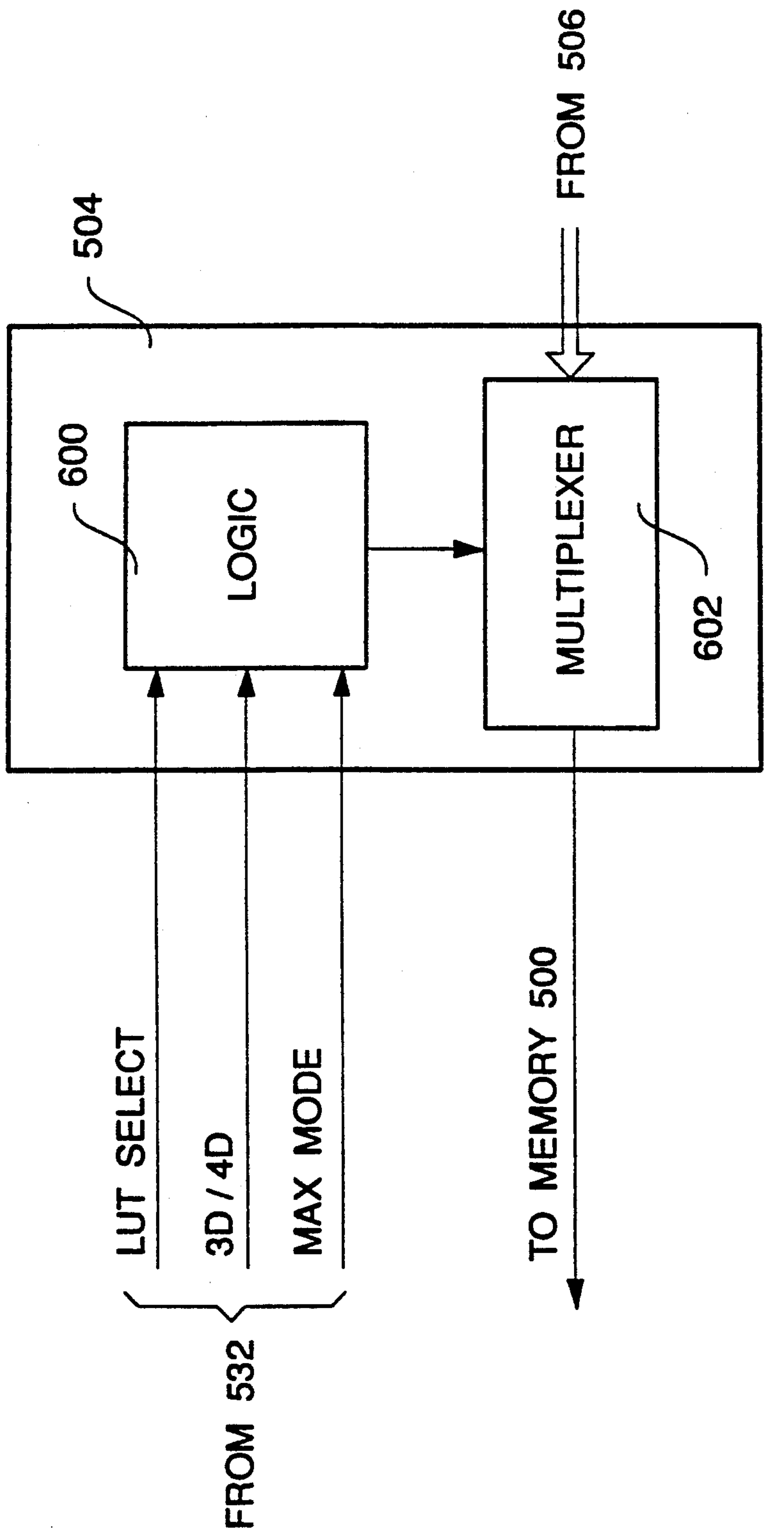
FIG. 37 is a block diagram of address switch 504 of FIG. 36.

Reference is now made to FIG. 37, which is a block diagram of address switch 504 of FIG. 36. As shown, switch 504 comprises a logic unit 600 and a multiplexer 602 which interfaces with address ALU 506 of FIG. 36. The logic block 600 may be implemented using a PAL such as the AMD 18L4. The multiplexer 602 may be implemented using the 74F153 from Philips.

The switch 504 preferably addresses memory 500 according to at least one option selection by a user and communicated via control sequencer 532. A first signal from control sequencer 532 indicates which of the LUTs stored in memory 500 is to accessed. Typically memory 500 stores 1D LUT 450, 4D LUT 452 and 1D LUT 456. A second signal from control sequencer 532 indicates whether the input data is three or four dimensional, which in turn determines whether LUT 452 is a three dimensional LUT or a four dimensional LUT.

A third signal is operative to select either a maximum or a minimum mode if a three dimensional LUT is used. In the minimum mode, each of the three separations of dimensions are addressed in four bits. The remaining four bits are used for coefficient generation. In the maximum mode, each of the three separations or dimensions are addressed in five bits, and therefore only three bits remain for coefficient generation. For this purpose, memory 500 preferably has a capacity of 128K 40-bit words.

Figure 38:
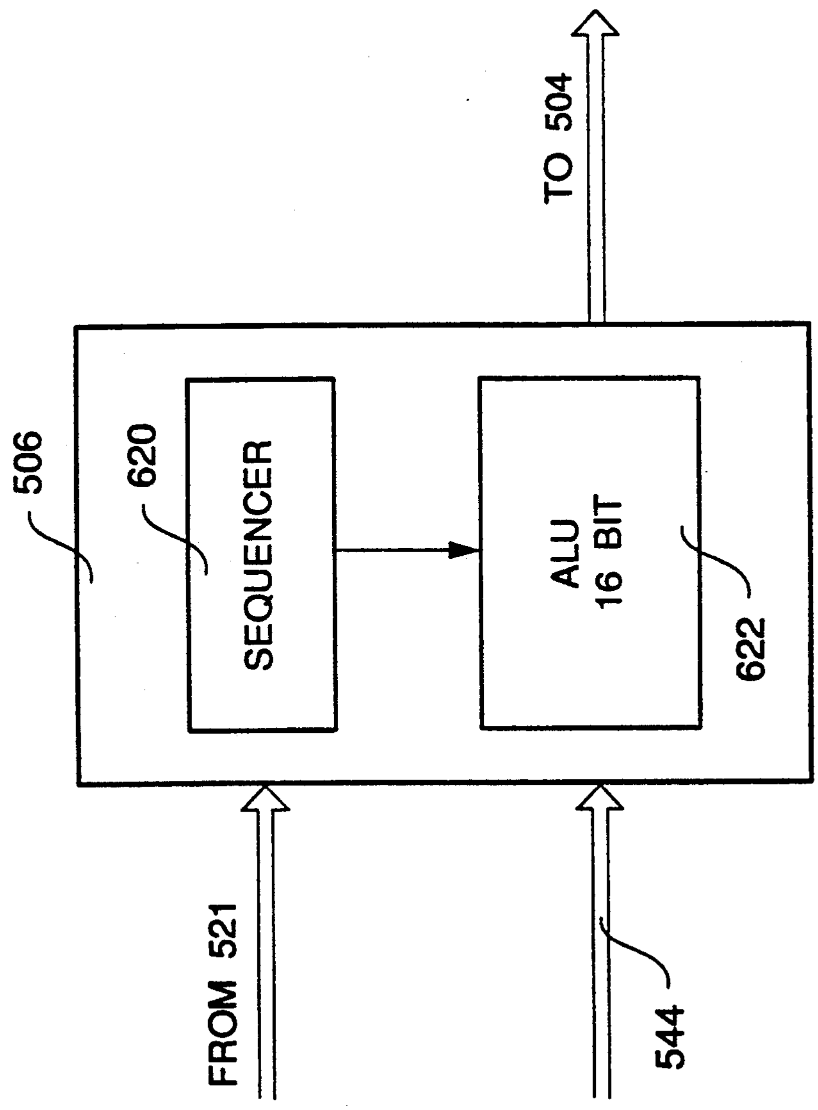
FIG. 38 is a block diagram of address ALU 506 of FIG. 36 constructed and operative in accordance with a preferred embodiment of the present invention.

Reference is now made to FIG. 38, which is a block diagram of the address ALU 506 of FIG. 36, constructed and operative in accordance with a preferred embodiment of the present invention. The ALU 506 preferably comprises a sequencer 620 such as a AMD PAL22V10, and a 16 bit ALU 622. The sequencer 620 receives a control signal from coefficient generator 524 which indicates which addresses are to be used for interpolation. ALU 622 is operative to add one to the appropriate components of the MSB-determined address arriving from address bus 544, thereby to provide the addresses to be used for interpolation.

Figure 39:
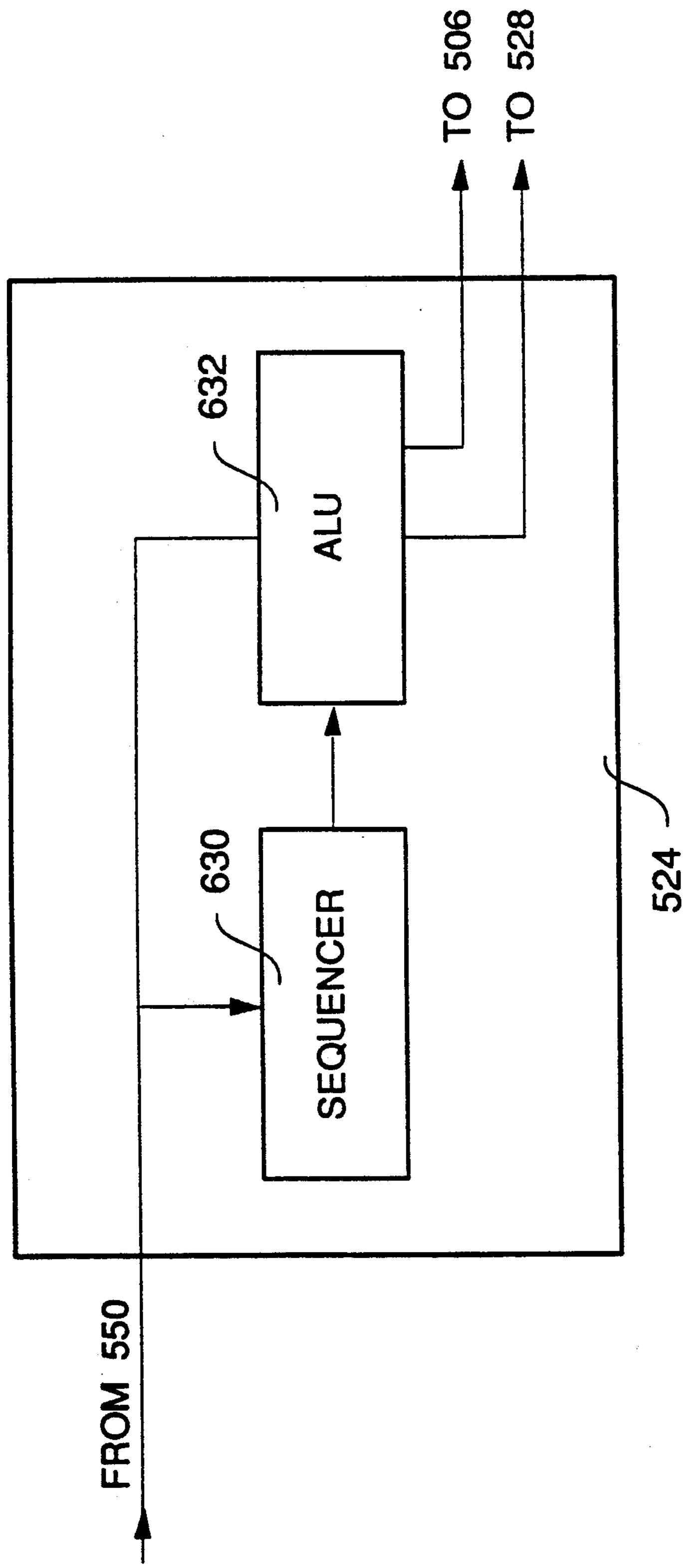
FIG. 39 is a block diagram of coefficient generator 524 of FIG. 36.

Reference is now made to FIG. 39, which is a block diagram of the 4D coefficient generator 524 of FIG. 36. The 4D coefficient generator 524 preferably comprises a sequencer 630 such as the ALTERA EPM 5032, commercially available from Altera, Santa Clara, Calif., USA and an ALU 632 which may be based upon a WS 59032.

Figure 40:
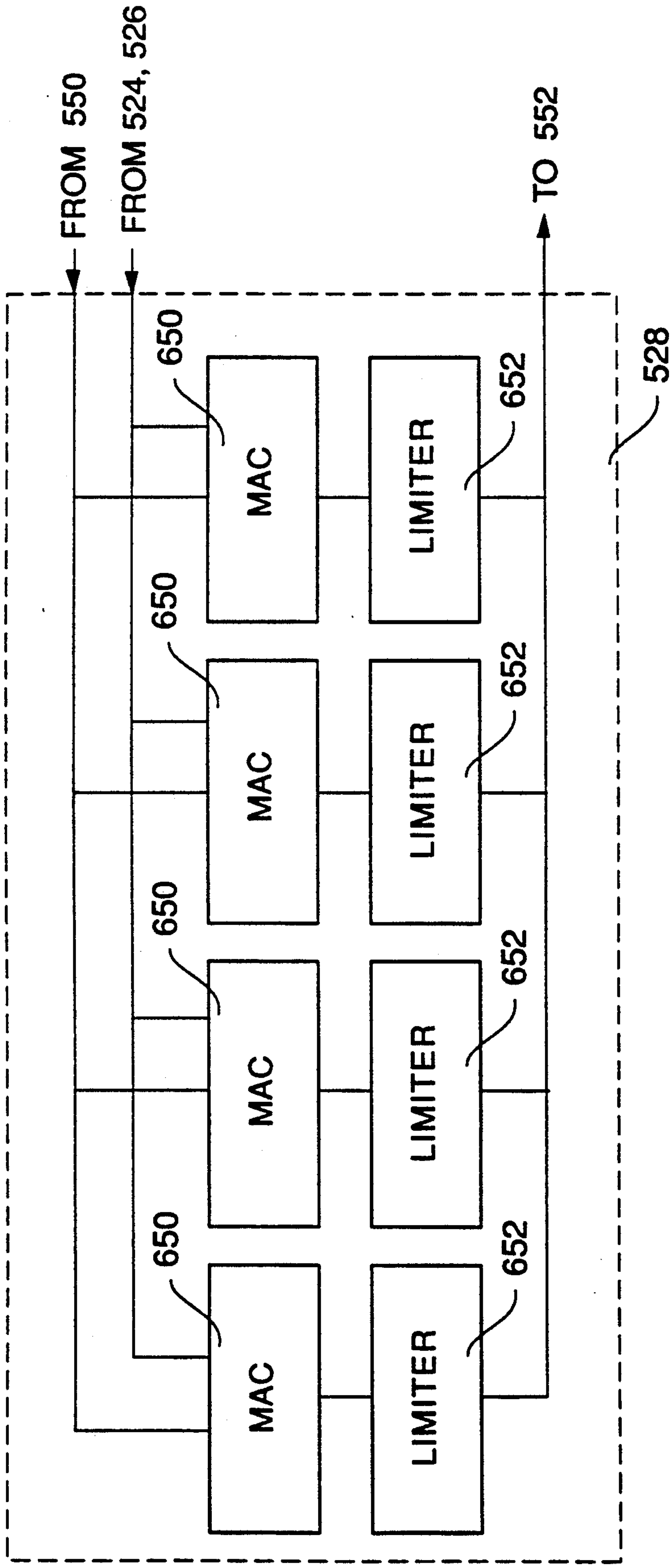
FIG. 40 is a block diagram of the multiplier array 528 of FIG. 36.

Reference is now made to FIG. 40, which is a block diagram of the multiplier/accumulator array 528 of FIG. 36, which comprises four multiplier/accumulators 650 such as the TRW2010, commercially available from TRW, La Jolla, Calif., USA, and four limiters 652 interfacing with the multiplier/accumulators 650 as shown.

A preferred embodiment of the present invention will now be described in detail with reference to FIGS. 41–44.

Reference is now made to FIG. 41 which is a generalized block diagram of a preferred embodiment of the present invention. As shown, the apparatus of the present invention comprises an input module 1010, which may receive CT, LW or Postscript input, a spatial module 1012 which interfaces with the input module and is operative to perform spatial transformations of the input data, a color module 1014 which is operative to perform color transformations of the spatially transformed input data, and an output module 1016.

According to an alternative embodiment of the present invention, the location of spatial module 1012 and color module 1014 may be reversed.

Figure 42:
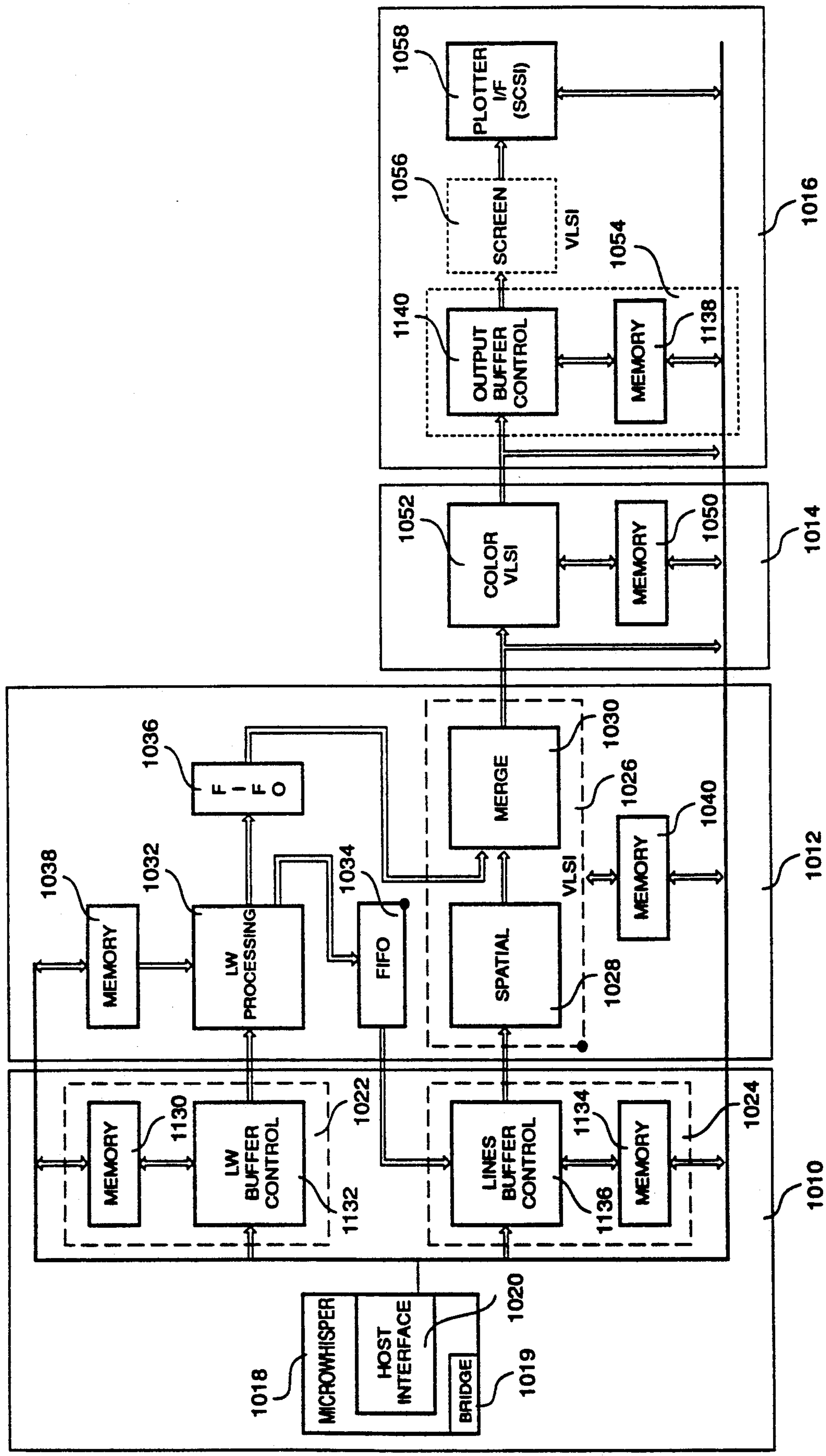
FIG. 42 is an intermediate detail block diagram of the embodiment of FIG. 41.

Reference is now made to FIG. 42 which is an intermediate detail block diagram of the elements of FIG. 41. As seen, the input module 1010 comprises a host 1018 which may comprise a MicroWhisper workstation, commercially available from Scitex Corporation, Herzlia, Israel, in conjunction with an interface module 1020. The workstation 1018 is used for creating, storing, editing and retouching of color images, as well as for interfacing with color image processing equipment such as scanners and plotters.

The host 1018 also preferably comprises a Postscript bridging unit 1019 which is operative to receive a representation of a color image in Postscript format and to convert the representation into LW/CT format, thereby enabling further processing of the color image. Bridging unit 1019 may comprise a PS Bridge, commercially available from Scitex Corporation, Herzlia, Israel.

Host interface 1020 typically inputs to a LW buffer means 1022 and a lines buffer means 1024.

The LW buffer means 1022 stores LW data pertaining to the vicinity of a portion of an image being processed. The lines buffer means 1024 stores CT data pertaining to a vicinity of the portion of the image being processed. Typically 5L complete lines are stored at a time, where L is an integer such as 20. The lines buffer means 1024 also is operative to convert data received in line interleaves format into pixel interleaves formatted data.

In the present specification, the terms "rows" and "line" are generally used interchangeably.

The spatial module 1012 comprises a spatial processing unit 1026 which typically comprises a spatial subunit 1028 and a merging subunit 1030. Spatial and merging subunits 1028 and 1030 may be implemented as a single VLSI. Appendix D whose material is incorporated by reference to copending 650,461, is a netlist generated by a VLSI generating software package commercially available from LSI LOGIC, 1551 McCarthy Blvd., Milpitas, Calif., 95035. This netlist is a complete description of a VLSI embodiment of spatial and merging subunits 1028 and 1030 of FIG. 42.

The spatial subunit 1028 is operative to perform suitable convolution and averaging operations if it is desired to change the resolution of the CT representation to a new resolution, termed herein the "output resolution". The merging subunit 1030 is operative to merge the CT data from spatial subunit 1028 with the LW data which arrives form the LW processing unit 1032. A more detailed description of a preferred embodiment of merging subunit 1030 is provided below with reference to FIG. 43, which is a generalized block diagram of merge unit 1030.

The spatial module 1012 also comprises a LW processing unit 1032. LW processing unit 1032 is operative to receive LW data from LW buffer means 1022 and change the resolution of the LW data to correspond to the resolution of the CT data. LW processing unit 1032 provides the "validity bit" of the LW data, at the new CT resolution, to lines buffer 1024 typically via a FIFO 1034. The resolution of the LW data is also changed to correspond to the output resolution. The LW data at the output resolution is provided to the merger 1030 for merging with the CT data via a FIFO 1036.

Appendix K whose material is incorporated by reference to copending 650,461 is a computer listing of software which, when used in conjunction with the DSP 96002, commercially available from Motorola, forms a complete implementation of a preferred embodiment of the LW processing unit 1032.

A LW processing memory 1038 is provided in operative association with LW processing unit 1032 for storing the program of the LW processing unit 1032 as well as the key to the LW color code, as explained in the Background of the Invention section above.

A color interface memory 1040 is preferably provided which stores the four 1D LUTs 440 of FIG. 29. The four 1D LUTs 440 are each operative to do any or all of the following:

a. introduce one dimensional transformations of color component values, including transformations from system values to color dot percents and vice versa;

b. perform non-linear transformations such as those illustrated in FIGS. 30–32 above. For example, non-linear transformations are used when it is desired to introduce tone and color gradations.

The color module 1014 is operative to perform color transformations of the spatially transformed input data. Preferred modes of operation of the color module 1014 are described hereinabove with reference to FIGS. 29, and 35–40. The color module 1014 typically comprises a memory 1050 and a color subunit 1052. The memory 1050 may comprise a static RAM array, which may comprise a plurality of static RAMs, such as the S128K8, commercially available from Iona, 2220 Martin Ave., Santa Clara, Calif., U.S.A.

A general discussion of a preferred hardware implementation of color module 1052 is provided below with reference to FIG. 44. A complete description of a VLSI embodiment of color subunit 1052 is provided in Appendix E. Appendix E is a netlist generated by a VLSI generating software package commercially available from LSI LOGIC, 1551 McCarthy Blvd., Milpitas, Calif., 95035.

The color module 1014 outputs to the output module 1016 which typically comprises an output buffer 1054, a screening unit 1056 and a plotter interface unit 1058. The output buffer 1054 is operative to change interleaves, e.g. to change pixel interleaves format to line interleaves format, where suitable.

The screening unit 1056 may be based upon the screening device disclosed in co-assigned U.S. Pat. Nos. 4,350,996 and 4,456,924 to Gidon Rosenfeld, the disclosure of which is incorporated herein by reference. If the plotter or other output device employed does not require a screening process of requires a screening process and has a built-in screening unit, screening unit 1056 may be eliminated.

Output device interface 1058 is the interface to the particular output device which it is desired to employ. For example, if it is desired to employ the Iris 4012 proofer, commercially available from Iris Corporation, CITY, Mass., the output device interface may comprise a NCR 53C700, commercially available from NCR, 1635 Aeroplaza Dr., Colorado Springs, Colo., U.S.A. This component may be programmed using the programming guide provided by the manufacturer for this component.

Figure 43:
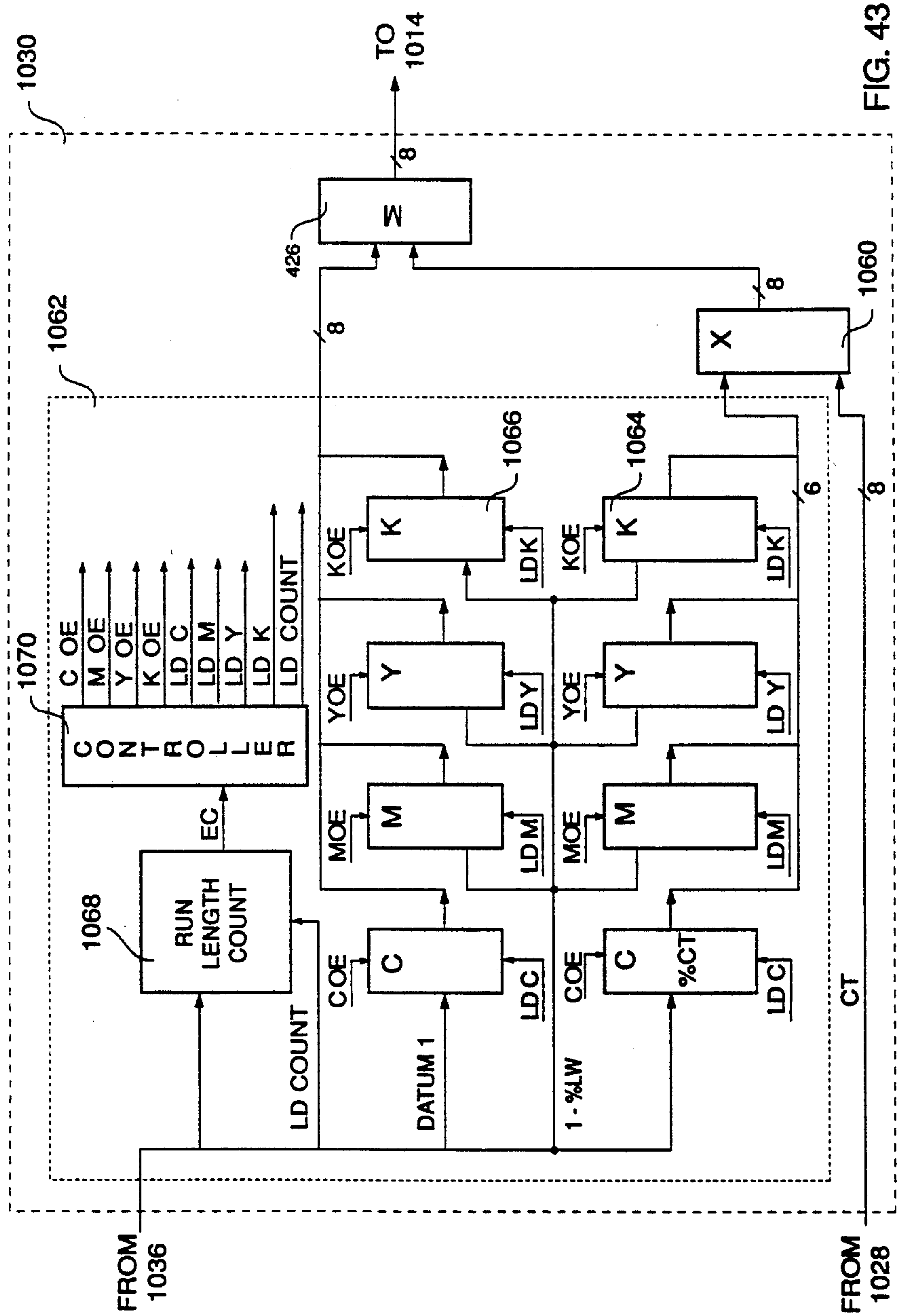
FIG. 43 is a detailed block diagram of a preferred implementation of merge unit 1030 of FIG. 42.

Reference is now made to FIG. 43 which is a detailed block diagram of a preferred implementation of merge unit 1030 of FIG. 42. The embodiment of FIG. 43 is similar to the embodiment of FIG. 25 and similar elements are identically referenced for convenience. However, the LUT 422 of FIG. 25 which is operative to implement the multiplicative formulae of data1 and data2, as defined above with reference to FIG. 25, is here replaced by a multiplier 1060 operating in conjunction with LW processing unit 1032 of FIG. 42. The merge unit 1030 also comprises register means 1062, typically comprising a first "space percentage" register array 1064 and a second "color" register array 1066; a counter 1068; and a controller 1070. Each of the two register arrays 1064 and 1066 preferably comprises one register for each separation, or typically 4 registers if four separations are used. The controller 1070 is operative in conjunction with counter 1068 to load the registers 1064 and 1066. All of the above components may be implemented by selecting suitable off the shelf components. Alternatively, the entire apparatus illustrated in FIG. 43 may be implemented in VLSI form, as explained hereinabove.

A preferred method for merging CT data and LW data, using the apparatus of FIG. 43, will now be described. The LW data at output resolution arrives from LW processing unit 1032 of FIG. 42 via the FIFO 1036, as shown. The CT data at output resolution arrives from spatial subunit 1028. The LW data is received by space percentage register array 1064, color register array 1066 and counter 1068. Counter 1068 receives the run length of the currently processed LW run. Color register array 1066 receives the value data1, defined hereinabove with reference to FIG. 25, which is the color component value vector indicating the color of the LW pixel weighted by the "non-transparency" of the LW pixel.

Spatial percentage register array 1064 receives, for each register, 100-%LW, which is the percentage of the area of the output LW pixel which is valid CT, i.e. LW transparent. The value 100- %LW is computed by LW processing unit 1032. Multiplier 1060 is operative to multiply the CT color component values arriving from spatial subunit 1028, by the corresponding 100-%LW value stored in the corresponding register of register array 1064. The result of the multiplication of multiplier 1060 is added, at full adder 426, to the corresponding data1 value arriving from the corresponding register or register array 1066. An output indication of the sum is provided to color module 1014.

Figure 44:
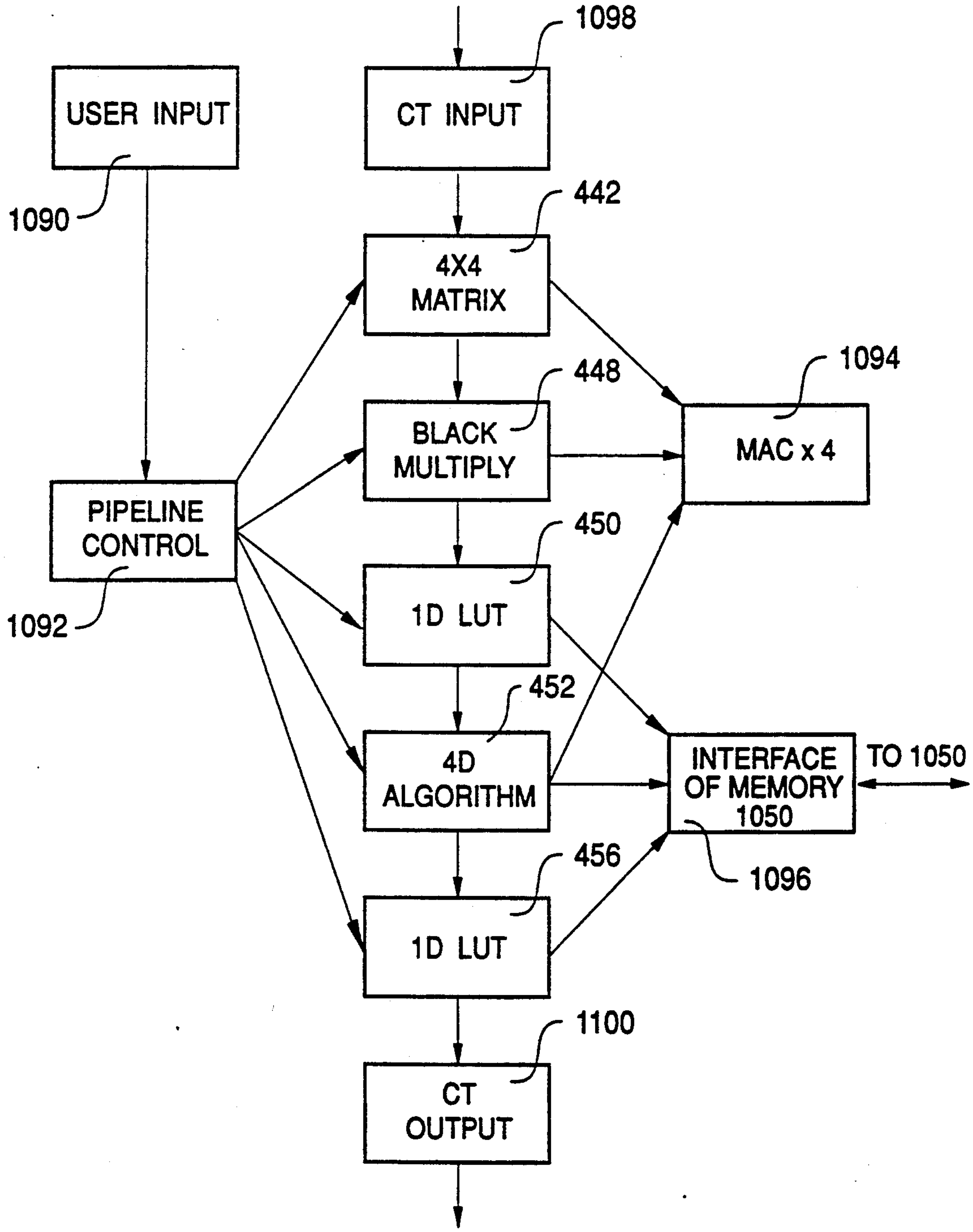
FIG. 44 is a generalized block diagram of a preferred hardware implementation of color module 1014 of FIG. 41.

Reference is now made to FIG. 44 which is a generalized block diagram of a preferred hardware implementation of color module 1014. The hardware implementation of FIG. 44 is more easily understood with reference to the discussion of FIG. 29 above, since FIG. 19 is a conceptualized illustration of the same apparatus. Similar elements are referenced with identical reference numerals, for convenience.

As shown, the color processing blocks comprise the 4×4 matrix 442 of FIG. 29, the black multiplication unit 448 of FIG. 29, the 1D LUT applying unit 450 of FIG. 29, the 4 D LUT applying unit 452 of FIG. 29 and the 1D LUT applying unit 456 of FIG. 29. A user interface 1090 is preferably provided in order to allow the user to choose to bypass one or more of the above color processing blocks. The user may also provide other input. For example, the user may choose to employ a self-diagnostic mode of the apparatus, or a matrix parameter loading mode of the apparatus. A pipeline control unit 1092 is provided to control the flow of information through the color processing blocks, preferably using pipelining techniques.

According to a preferred embodiment of the invention, a single multiplier-accumulator unit 1094 is provided in association with 4×4 matrix 442, black multiplying unit 448 and 4D LUT applying unit 452, in order to conserve resources. Multiplier-accumulator unit 1094 typically comprises four multiplier-accumulators, corresponding to the four separations. A memory interface 1096 is provided to interface memory 1050 of FIG. 42 which stores the LUTs for the LUT applying units 450, 452 and 456. Input and output modules 1098 and 1100 are also provided.

Referring back to FIG. 42, the LW buffer 1022 typically comprises a memory component 1130, which may be a video RAM. The LW buffer 1022 also comprises a control component 1132. The lines buffer 1024 typically comprises a memory component 1134, which may be a video RAM. The lines buffer 1024 also comprises a control component 1136. The CT buffer 1954 typically comprises a memory component 1138 which may be a video RAM. The CT buffer 1054 also comprises a control component 1140.

A suitable video RAM (VRAM) for implementing memory components 1130, 1134 and 1138 is an MT42C4255, commercially available from Micron, 2805 East Columbia Road, Boise, Ida., USA.

Appendix F is a EPM 5128 netlist generated by a component generating software package commercially available under the mark MAXPLUS from Altera, 2610 Orchard Parkway, San Jose, Calif., USA. This netlist is a complete description of the control component 1132 of LW buffer 1022 of FIG. 42.

Appendix I is a EPM 5192 netlist generated by a component generating software package commercially available under the mark MAXPLUS from Altera, 2610 Orchard Parkway, San Jose, Calif., USA. This netlist is a complete description of the control component 1136 of lines buffer 1024 of FIG. 42.

Appendix G is a EPM 5128 netlist generated by a component generating software package commercially available under the mark MAXPLUS from Altera, 2610 Orchard Parkway, San Jose, Calif., USA. This netlist is a complete description of the control component 1140 of output buffer 1054 of FIG. 42.

Appendix J is a netlist generated by a component generating software package commercially available under the mark ACE from Daizix. This netlist is a complete description of the following components of FIG. 42: host interface 1020, FIFO 1034, FIFO 1036, LW processing memory 1038, memory 1040, memory 1050, LW buffer video RAM component 1130, the lines buffer video RAM component 1134, the output buffer video RAM component 1138, and the interconnections of all the above components to one another as shown in FIG. 42 as well as their interconnections to the following units of FIG. 42: LW processing unit 1032, color subunit 1052, the LW buffer control component 1132, the lines buffer control component 1136, he output buffer control component 1140. The netlist interconnects off-the-shelf components, a list of which forms part of Appendix J.

Appendices L-S are computer listings of the eight PAL components of Appendix J. Each PAL component comprises a 22V10, commercially available from AMD, Sunnyvale, Calif., USA.

Reference is now made to FIGS. 45-52 which are conceptual illustrations of examples in which LW pixels, CT pixels and output pixels are shown superimposed onto one another. Preferred methods of computing the color values of the output pixels, for each example, are now described, in order to clarify preferred principles of operation of the CT/LW merging methods shown and described hereinabove. The computations shown and described herein refer particularly to the embodiment of FIG. 8 shown and described hereinabove.

In all of FIGS. 45-52, LW pixels are indicated by a dotted line, CT pixels are indicated by a broken line, and output pixels are indicated by a solid line.

Figure 45:
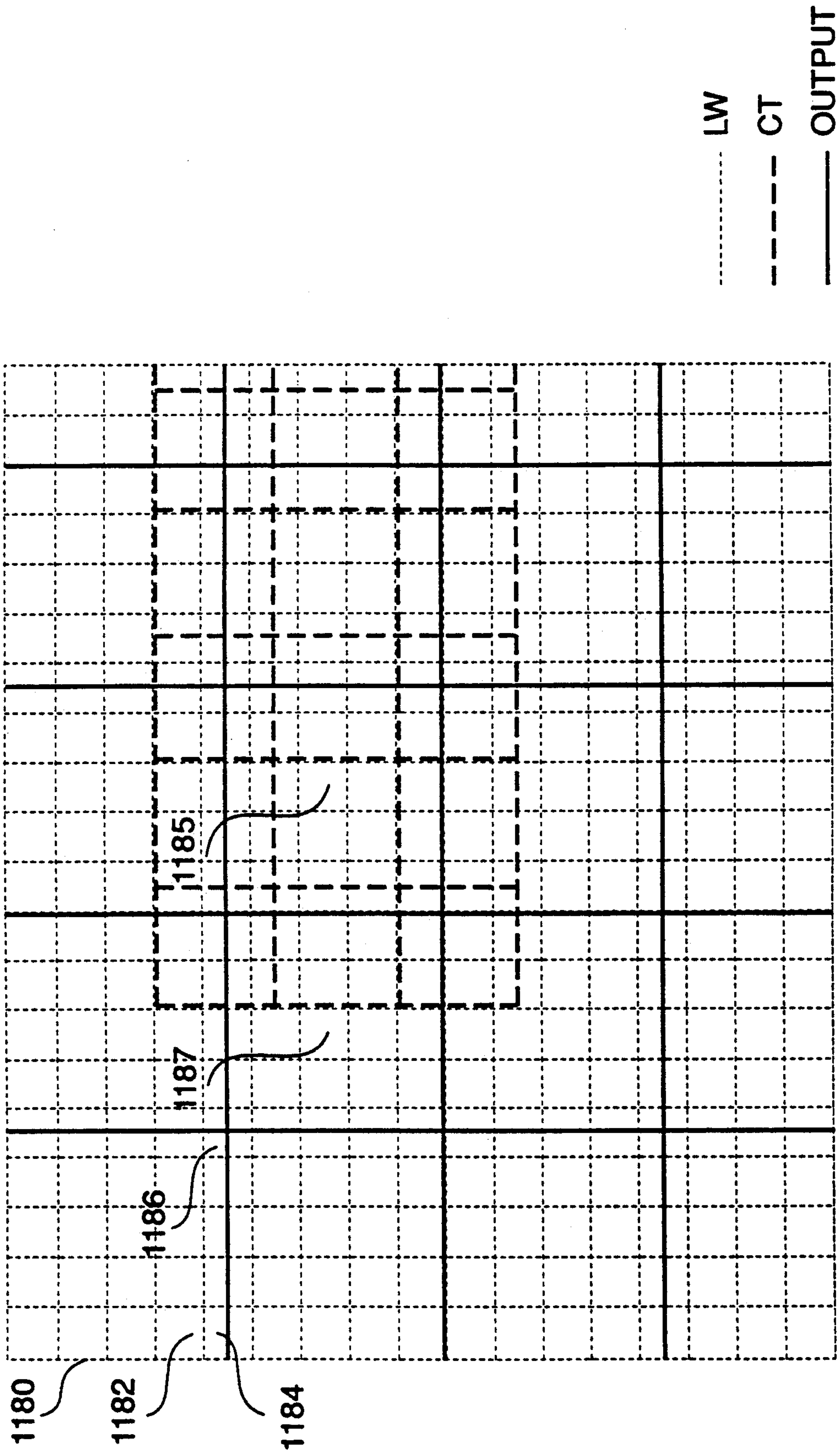
FIGS. 45-52 are conceptual illustrations of examples in which LW pixels, CT pixels and output pixels are shown superimposed onto one another.

In FIG. 45, a typical array of pixels is shown which represents a portion of an image. The resolution of the LW pixels is higher than the resolution of the CT pixels which is higher than the resolution of the output pixels. Only part of the image portion is represented by the CT pixels. The LW pixels of the remainder of the image portion are not transparent to CT. The entirety of the image portion is represented by the LW pixels. The color values of the output pixels are to be computed as a function of the color values of the CT pixels and the LW pixels.

Output pixels which do not overlap any CT pixel, such as output pixel 1180, are assigned a color value which is an average of the color values of the LW pixels overlapping therewith, preferably weighted by the area of each LW pixel which is contained within the output pixel. For example, the color value of LW pixel 1182 will be given greater weight than the color value of LW pixel 1184, when computing the color value of output pixel 1180, because more of LW pixel 1182 is included in output pixel 1180. LW pixel 1186 will be given even less weight than LW pixel 1184, for the same reason.

Output pixels which are entirely covered by valid CT pixels, such as the output pixel 1185, are assigned a color value which is an average of the color values of the CT pixels partially or completely overlapping therewith, preferably weighted by the area of each CT pixel which is contained within the output pixel. Alternatively, the color value of the output pixel 1185 may be computed by convolution. However, a 5×5 convolution procedure is invalid in the present example, since the 5×5 CT pixel window surrounding output pixel 1185 is not completely valid. A 3×3 convolution procedure is valid.

Color values for output pixels, such as output pixel 1187 which is to the left of output pixel 1185, which are covered partially by non-transparent LW pixels and partially by valid CT pixels, may be computed as follows, with reference to the apparatus of FIG. 8:

a. The three CT pixels which partially overlap the output pixel 1187 are averaged by scaler 98 of FIG. 8. The average may be a simple average or may be weighted by the areas of overlap of the respective CT pixels with the output pixel. The average may be denoted AVERAGE(CT).

b. The 15 LW pixels which partially overlap the output pixel 1187 are averaged by LW to output averager 92. The average may be a simple average or may be weighted by the areas of overlap of the respective CT pixels with the output pixel. The average may be denoted AVERAGE (LW).

Output averager 92 also computes the proportion of the area of the output pixel 1187 which is covered by non-transparent LW pixels, %LW. In this instance, for example, %LW is slightly more than fifty.

c. The color value of the output pixel is computed as follows: color value=0.01×(%LW-×AVERAGE(LW)+(100−%LW-)×AVERAGE(CT))

Figure 46:
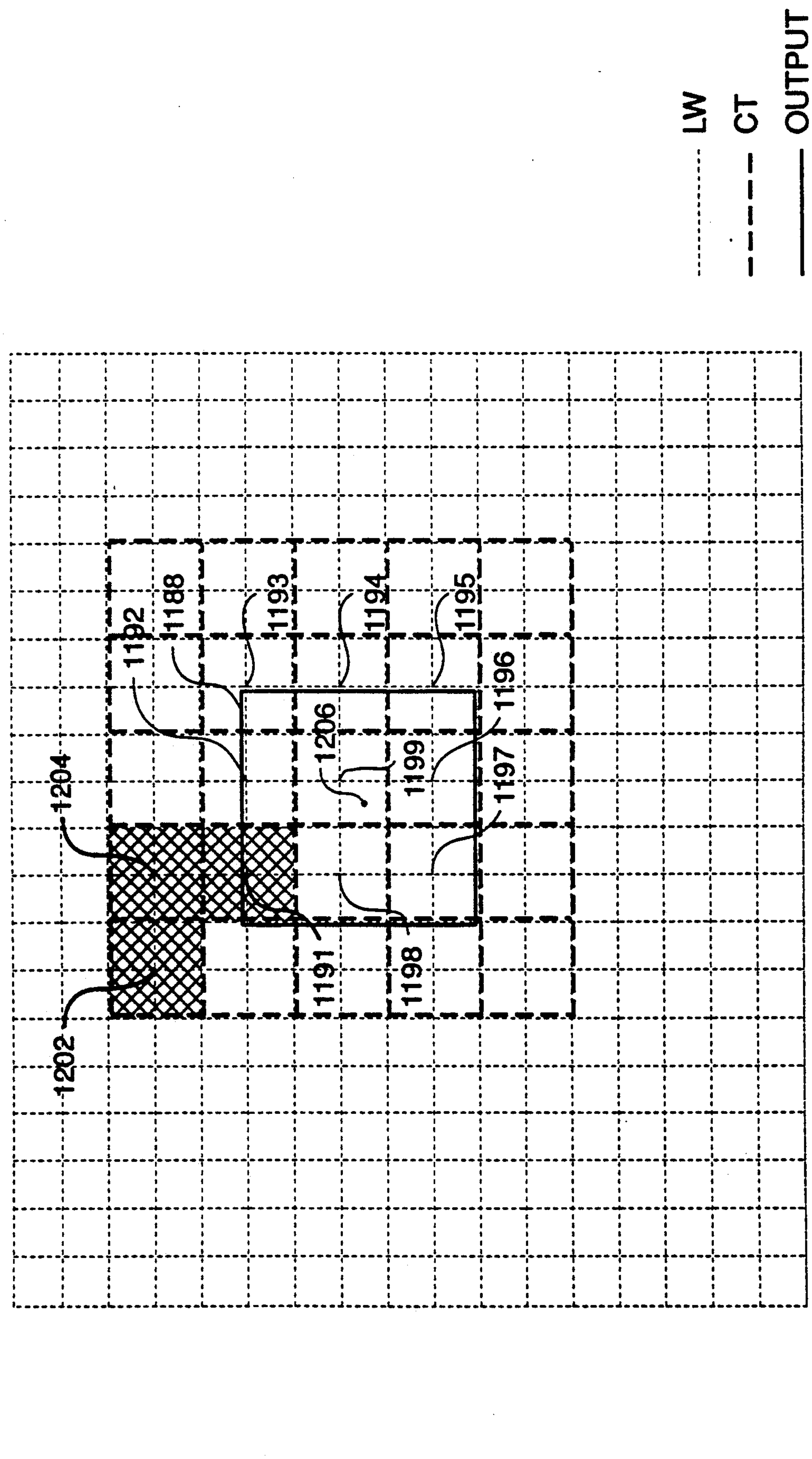

In FIG. 46, a single output pixel 1188 is shown. The ratio of the LW resolution to the CT resolution is 2. The ratio of the output resolution to the CT resolution is 0.4. Twelve of the LW pixels are cross-hatched to indicate that these LW pixels are not transparent to CT, and therefore the three CT pixels coinciding therewith are invalid, since a CT pixel is only valid if at least a portion thereof coincides with a transparent LW pixel. The LW pixels which are not cross-hatched are transparent to CT, and therefore, the non cross-hatched CT pixels are valid. The color value of output pixel 1188 may be computed as a weighted sum of a CT value representing the "valid" portion of the output pixel and a LW value representing the "invalid" portion of the output pixel. The LW value is weighted by %LW and the CT value is weighted by (100−%LW), as explained above.

The CT value may be computed by either of the following two methods:

(a) averaging, in which case the color values of all valid CT pixels which overlap the current output pixel are averaged. In this case, the 9 CT pixels 1192 -1199 which overlap output pixel 1188 are averaged, CT pixel 1191 is not valid and so the color value of CT pixel 1191 is disregarded. Preferably, the average is a weighted average, in which the weights reflect the area of each CT pixel which overlaps the output pixel 1188. For example, CT pixel 1198 will be given more weight than CT pixel 1192. For clarity, CT pixels 1192–1198 have each been referenced with an appropriately numbered line which denotes the center of the pixel.

(b) convolution, in which case all 25 CT pixels shown may be employed in a 5×5 convolution. However, convolution is not valid, since the three shaded CT pixels 1191, 1202 and 1204, which are invalid, are included in the convolution area.

The central CT pixel of the convolution matrix is defined to be the CT pixel 1199 covering the center 1206 of the output pixel 1188.

The LW value is computed by averaging the two shaded LW pixels contained within the output pixel.

%LW in the present example is 200/25.

Figure 47:
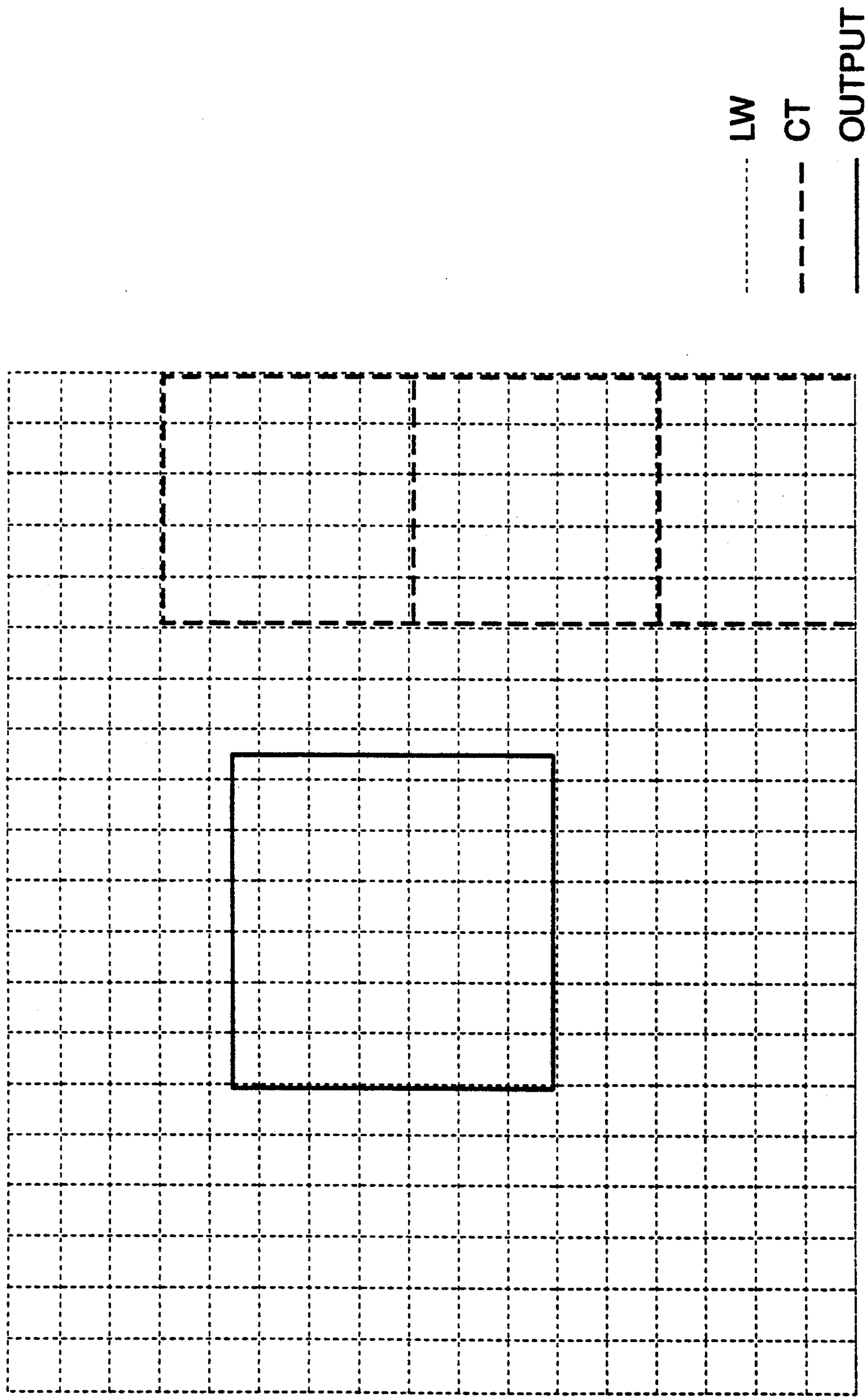

In FIG. 47, there are only three valid CT pixels, indicated by broken lines. Therefore, the output pixel indicated by a solid line is computed by averaging the 49 LW pixels overlapping or partially overlapping it. The average may be a simple average or may be weighted by the area of overlap of the respective LW pixels with the output pixel.

Figure 48:
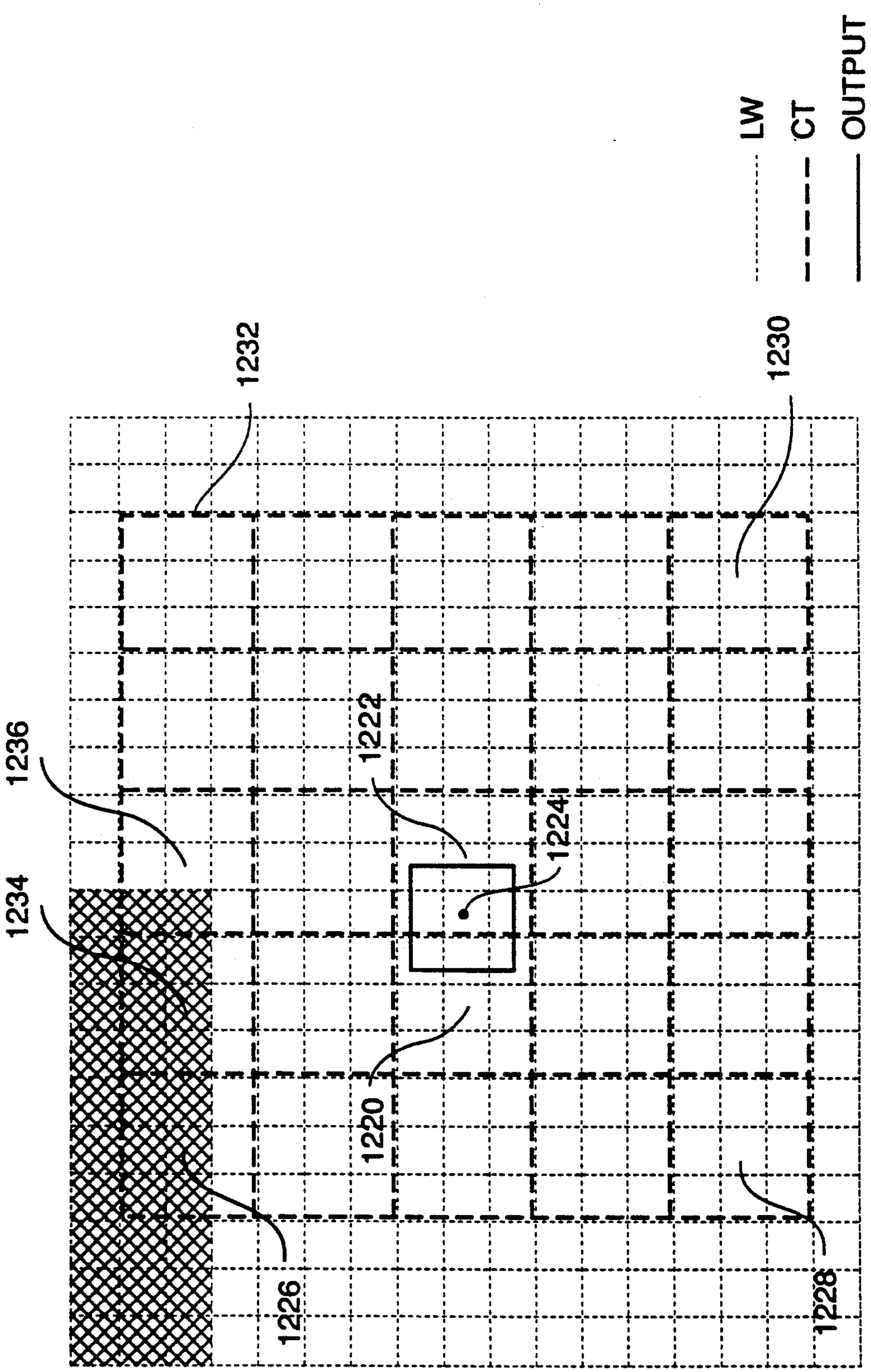

In FIG. 48, the output resolution is larger than the CT resolution, in contrast to FIGS. 45–47, but is still smaller than the LW resolution. Cross-hatched LW pixels are nontransparent LW pixels. The illustrated output pixel is entirely covered by valid CT pixels. As explained above with reference to FIG. 45, output pixels which are entirely covered by valid CT pixels are assigned a color value which is an average of the color values of the CT pixels partially or completely overlapping therewith, preferably weighted by the area of each CT pixel which is contained within the output pixel. In the present example, the output pixel overlaps two CT pixels 1220 and 1222.

The color value of the output pixel may also be computed by convolution, such as 5×5 convolution. The central pixel of the convolution matrix, which comprises 25 CT pixels, is the CT pixel which covers the center 1224 of the output pixel. Therefore, the 25 pixels of the convolution matrix are the 25 pixels bounded by matrix corner CT pixels 1226, 1228, 1230 and 1232. In the present example, the convolution matrix contains three CT pixels 1226, 1234 and 1236 which are partially covered by nontransparent LW pixels. However, these CT pixels are considered valid, since some of the LW covering them is transparent. CT pixels which are entirely covered with nontransparent LW are invalid, however the convolution matrix contains no such pixels. Since all the pixels of the convolution matrix are valid, the convolution is valid. Since the convolution is valid, convolution is the preferred method for computing the output pixel and the result thereof is used in preference over the result of the averaging method.

Figure 49:
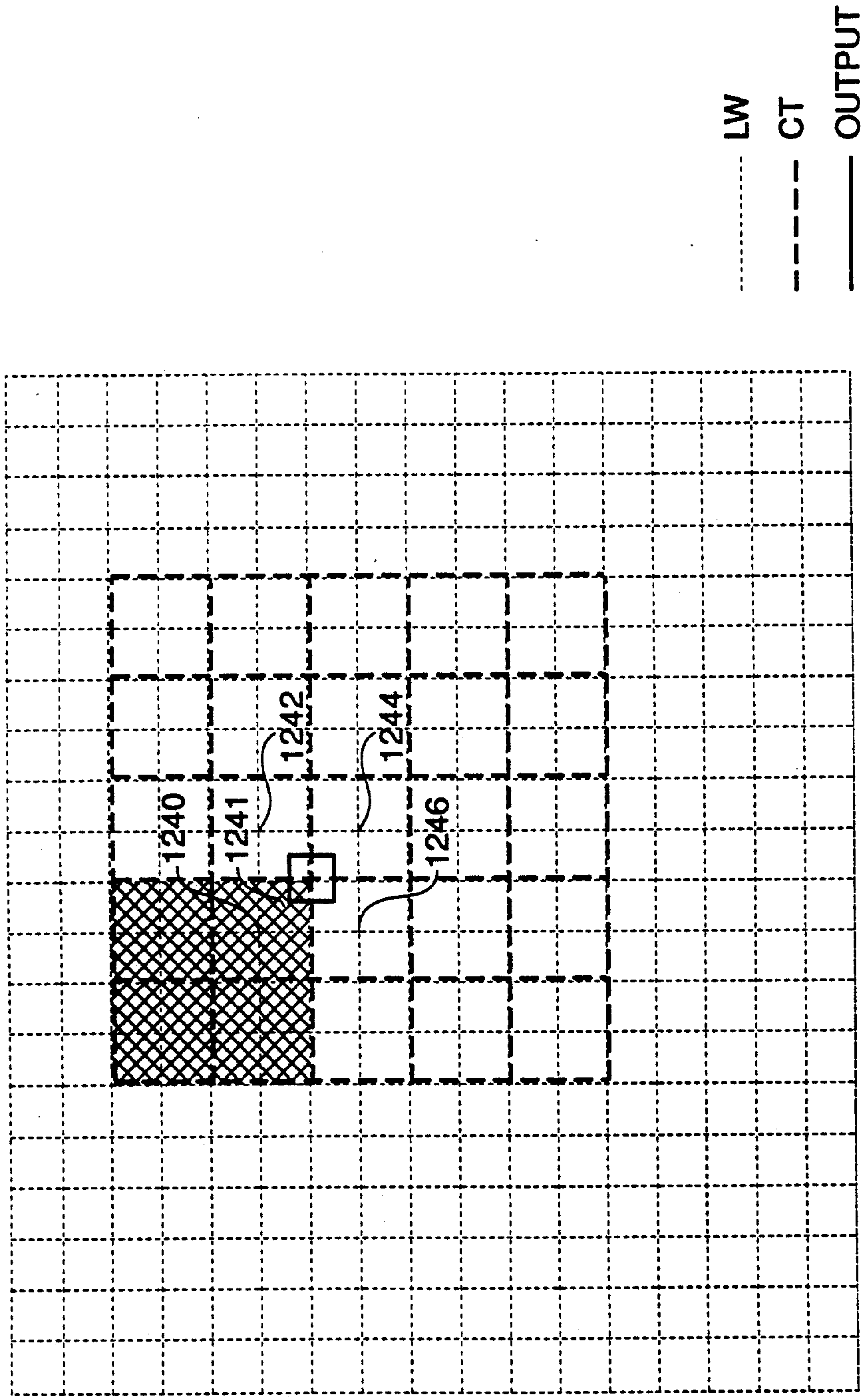

In FIG. 49, the output pixel cannot be computed by 5×5 convolution, because the 5×5 convolution window, comprising 25 CT pixels shown in broken lines, includes invalid CT pixels. Specifically, the cross hatching indicates nontransparent LW pixels. Therefore, the 2×2 output pixels in the uppermost lefthand corner of the convolution window are invalid, since they are entirely covered with nontransparent LW. Therefore, the output pixel is computed by averaging the values of all valid CT pixels which at least partially overlap the output pixel. In the present example, four CT pixels partially overlap the output pixel, namely CT pixels 1240, 1242, 1244 and 1246. However, CT pixel 1240 is invalid. Therefore, the output pixel may be computed by averaging the values of CT pixels 1242, 1244 and 1246 and LW pixel 1241.

Figure 50:
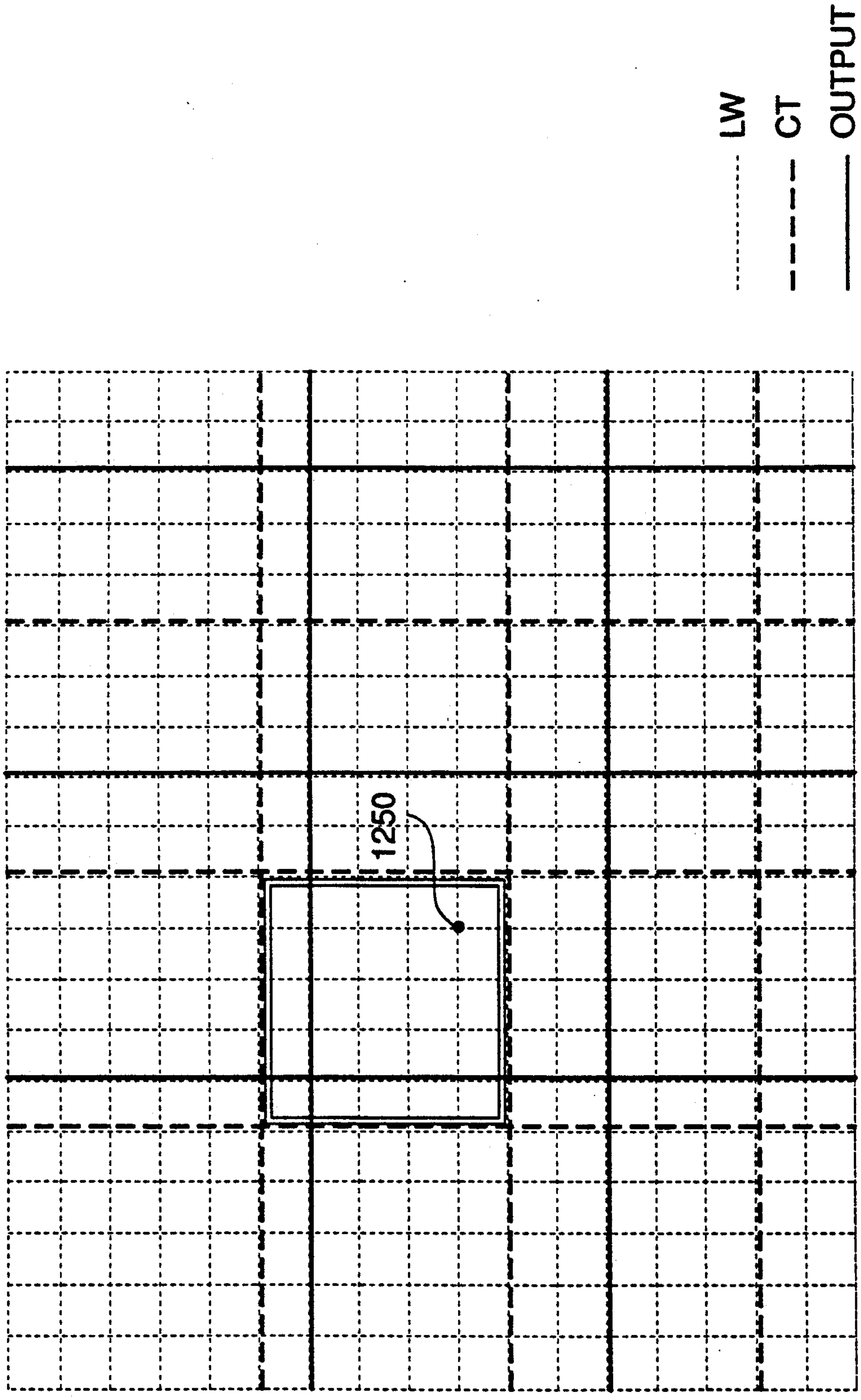

In FIG. 50, the output resolution is smaller than the CT resolution, as in previous figures such as FIG. 45.

Specifically, in FIG. 50, the output resolution : CT resolution ratio is 5:6, which is less than 1. In the present example, if it is desired to compute the value of the output pixel 1250 using 3 ×3 convolution, the convolution matrix would be the 3×3 CT pixels centered at the CT pixel indicated by a double line. The double-lined pixel is the central CT pixel because it contains the center of output pixel 1250.

Figure 51:
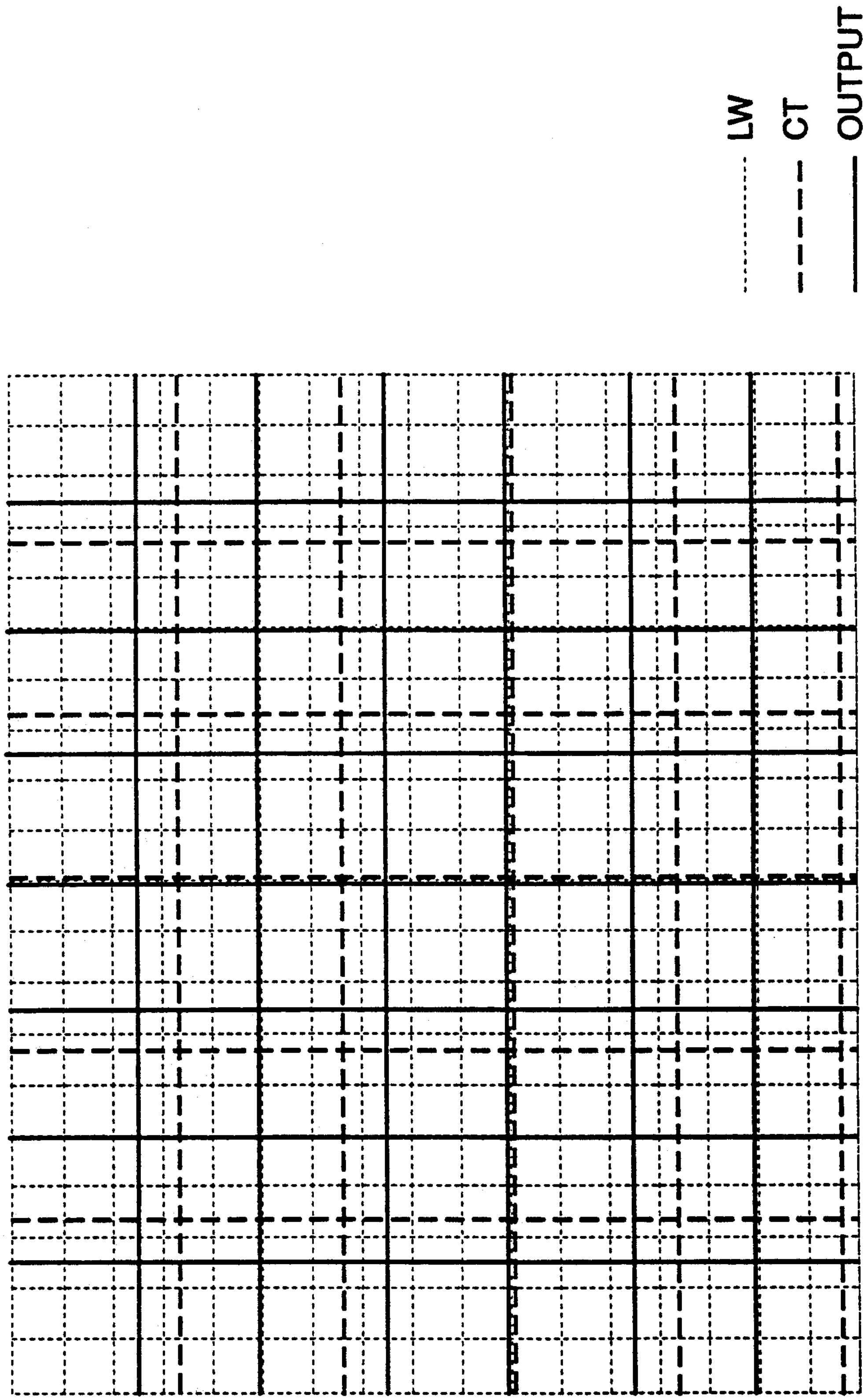

In FIG. 51, the ratio of output resolution to CT resolution is non-integer, as in FIG. 50.

Figure 52:
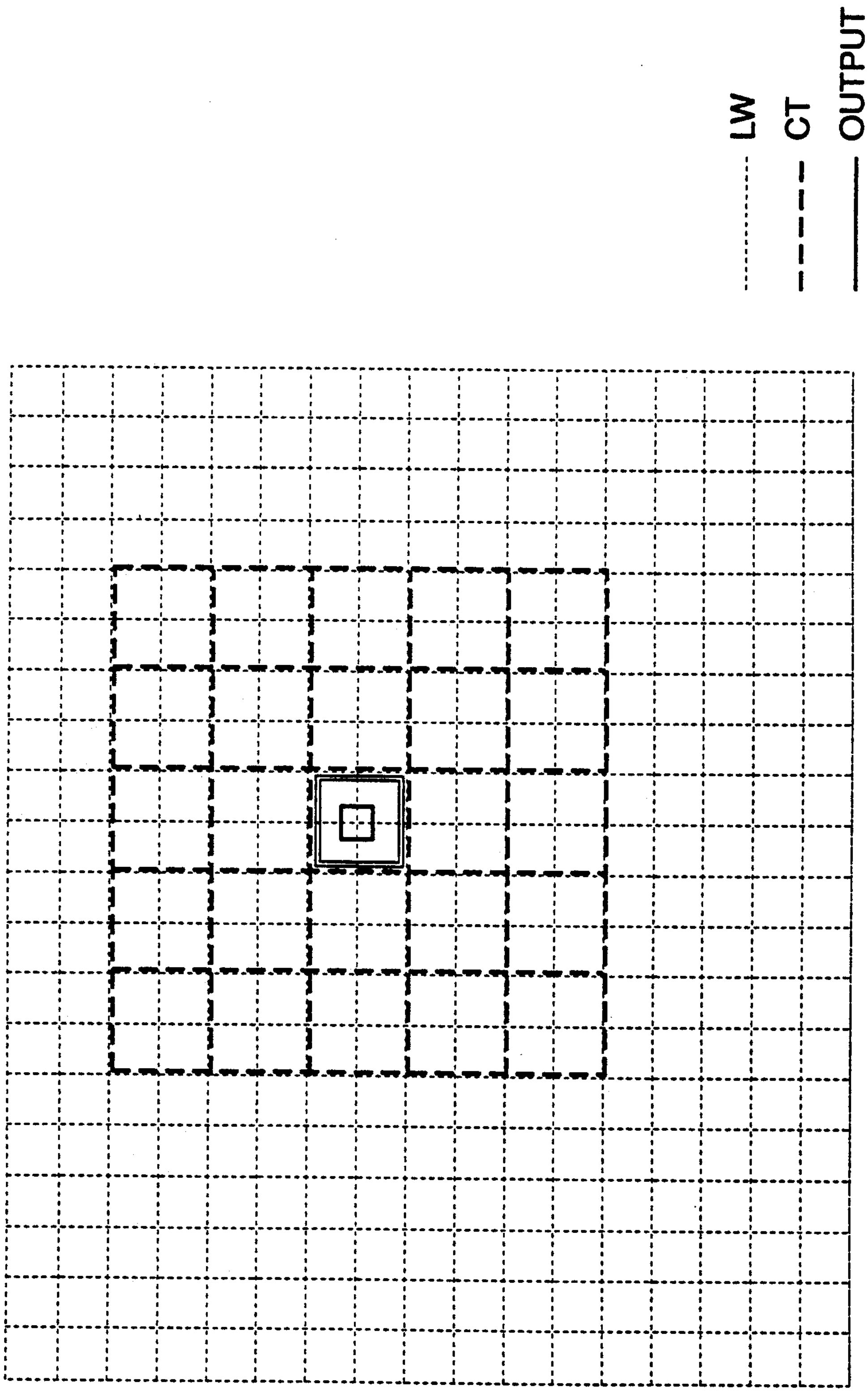

In FIG. 52, the output resolution is larger than the CT resolution, as in FIG. 48. All CT pixels, in the present example, are valid. As seen in FIG. 52, this can result in a situation whereby an output pixel to be computed in entirely contained with a single Ct pixel whose outline is indicated by a double line. In this case, the result of the averaging procedure is the value of the double lined CT pixel.

Convolution for more than 2 dimensions is now discussed in detail with reference to FIGS. 53 onward and also referring back to FIGS. 10, 12, 16 and 17.

The following discussion will pertain mainly to three dimensional convolution and to a comparison of three dimensional convolution to two dimensional convolution. It is appreciated, however, that the applicability of the discussion is not limited to three dimensions but rather, that the present discussion is intended to be illustrative of the principles required for implementing convolution of any desired dimension.

In the following discussion, the size of the convolution window is taken to be 5×5, or 5×5×5. This is merely for the purposes of illustration and it is appreciated that the size of the convolution window may be any suitable size and that the convolution window need not be a square or cube as in the following discussion.

In particular, it is appreciated that d dimensional convolution apparatus may be implemented by combining n devices $D_1, \ldots, D_n$, where each device $D_i$ (i=1, ..., n) is operative to perform convolution of dimension $d_i$, and where: $\text{sum}_i\, d_i = d$.

For example, 7 dimensional convolution apparatus may be provided by combining two 2 dimensional convolution devices, each of which may be similar to that described in FIG. 12, with a third 3 dimensional convolution device which may be similar to that described in FIG. 27.

It is appreciated that there are more ways of performing three dimensional convolution by repeatedly performing orthogonal convolutions than there are of performing two dimensional convolution by repeating orthogonal convolutions. This is because there is only one "layer" of partial results in two dimensional convolution, whereas there are two "layers" of partial results in three dimensional convolution.

For example, if two dimensional convolution is performed in a first direction such as the Y direction and then in a second direction such as the X direction, there is only one "layer" of partial results, namely the Y partial results, defined as $\text{sum}_j c_{j} p_{ij}$ where j runs from 1 to 5. Here each $P_{ij}$ is an input data element, such as a CT pixel.

Figure 53:
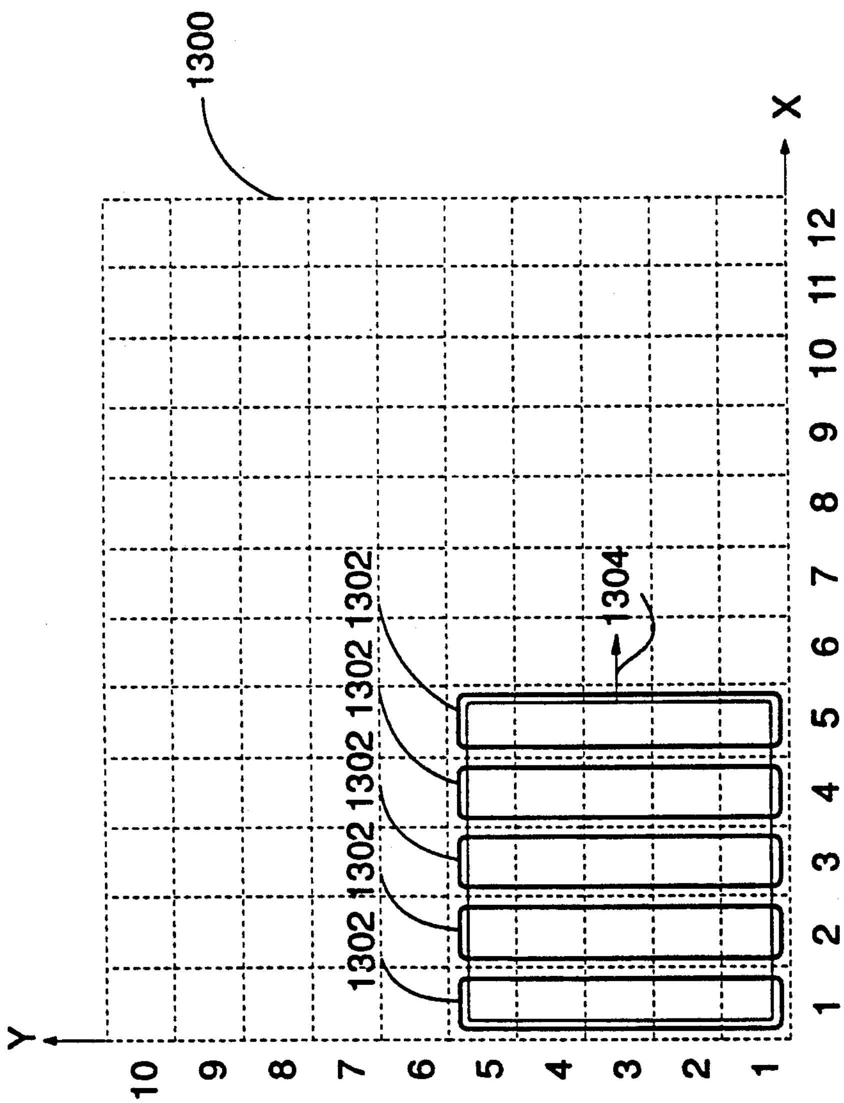
FIG. 53 is a conceptual illustration of a two dimensional input data image and a convolution window operating thereupon and traveling along the X axis.
Figure 54:
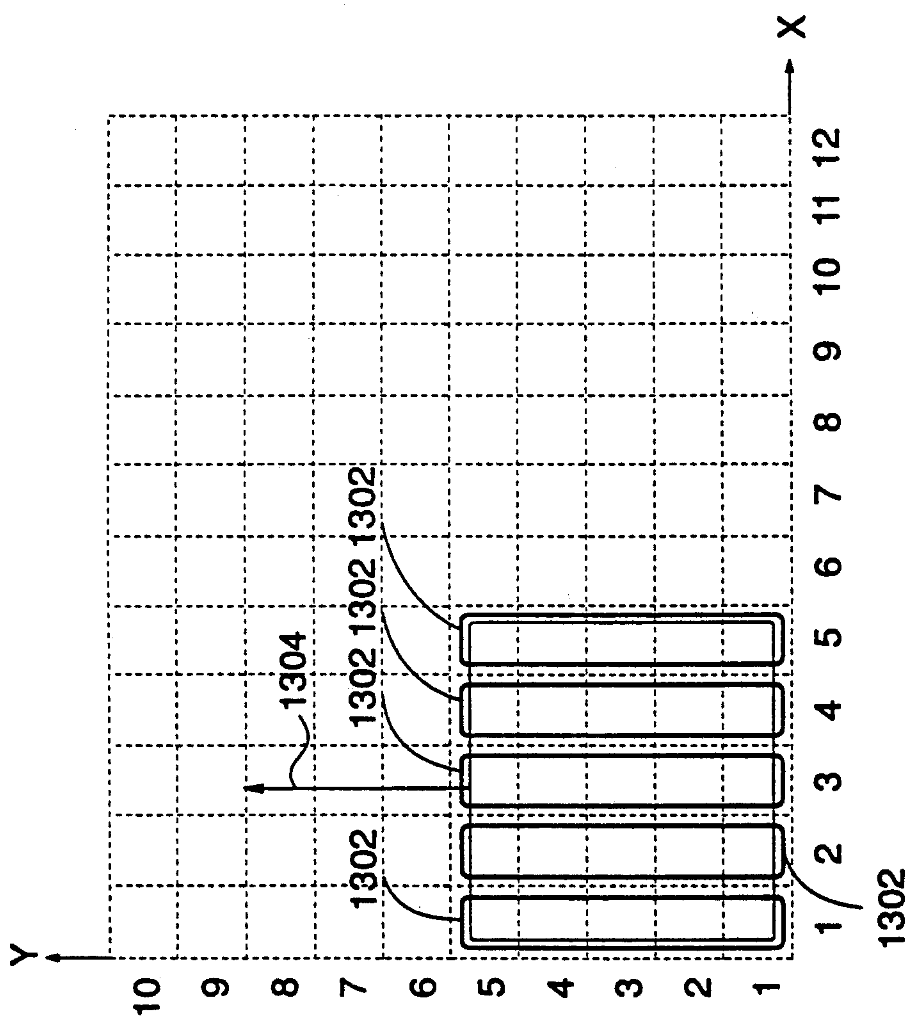
FIG. 54 is a conceptual illustration of a two dimensional input data image and a convolution window operating thereupon and traveling along the Y axis.

Reference is made to FIGS. 53 and 54 which conceptually illustrate a two dimensional input data image 1300 having 10 data elements along the Y axis and 12 data elements along the X axis. Also shown is an array of 5 Y partial results 1302, used in computing an output value for an output pixel whose center falls within the input pixel whose coordinates are (3,3). The input resolution to output resolution ratio is taken to be 1:1 in the present example, for purposes of simplification; however it is appreciated that the present discussion is applicable to any resolution ratio or density ratio.

In the present discussion, a pixel whose position along the X axis is a, and whose position along the Y axis is b is denoted (a,b). Generally, all coordinate system locations are defined herein such that the X coordinates precede the Y coordinates.

An arrow 1304 indicates the first direction of travel of the convolution window over the input data. As seen, in FIG. 53, the convolution window travels along the X axis. When the convolution window has reached the end of the X axis, the convolution window then advances one position along the Y axis (assuming that the input resolution or input density equals the output resolution or output density), again travels all the way along the X axis, and so on. As may be seen from FIG. 53, this way of traveling has the advantage of allowing the X partial results to be reused immediately.

The method of FIG. 53 may be implemented using the apparatus of FIG. 12, discussed above, and using the algorithm of FIG. 26, discussed above.

As seen, in FIG. 54, the convolution window travels along the Y axis. When the convolution window has reached the end of the axis, the convolution window then advances one position along the X axis (assuming that the input resolution or input density equals the output resolution or output density), again travels all the way along the Y axis, and so on. As may be seen from FIG. 53, this way of traveling does not allow the Y partial results to be reused immediately. Therefore, either the Y partial results for a particular position of the convolution window must be discarded, or the Y partial results for a particular position (such as the position shown in which the convolution window occupies the array 1-5, 1-5) of the convolution window must be stored until the convolution window has traveled up the Y axis until the center thereof is contained within input pixel (3,10), then proceeded to a location (4,1) at the bottom of the Y axis by displaced by 1 along the X axis, and finally has returned to the original position 3 along the Y axis, at location (4,3). Only when the convolution window is centered at (4,3), in which case the convolution window occupies the array [2,6]×[1.5] will the partial results computed when the convolution window occupied its initial position be used.

Figure 55:
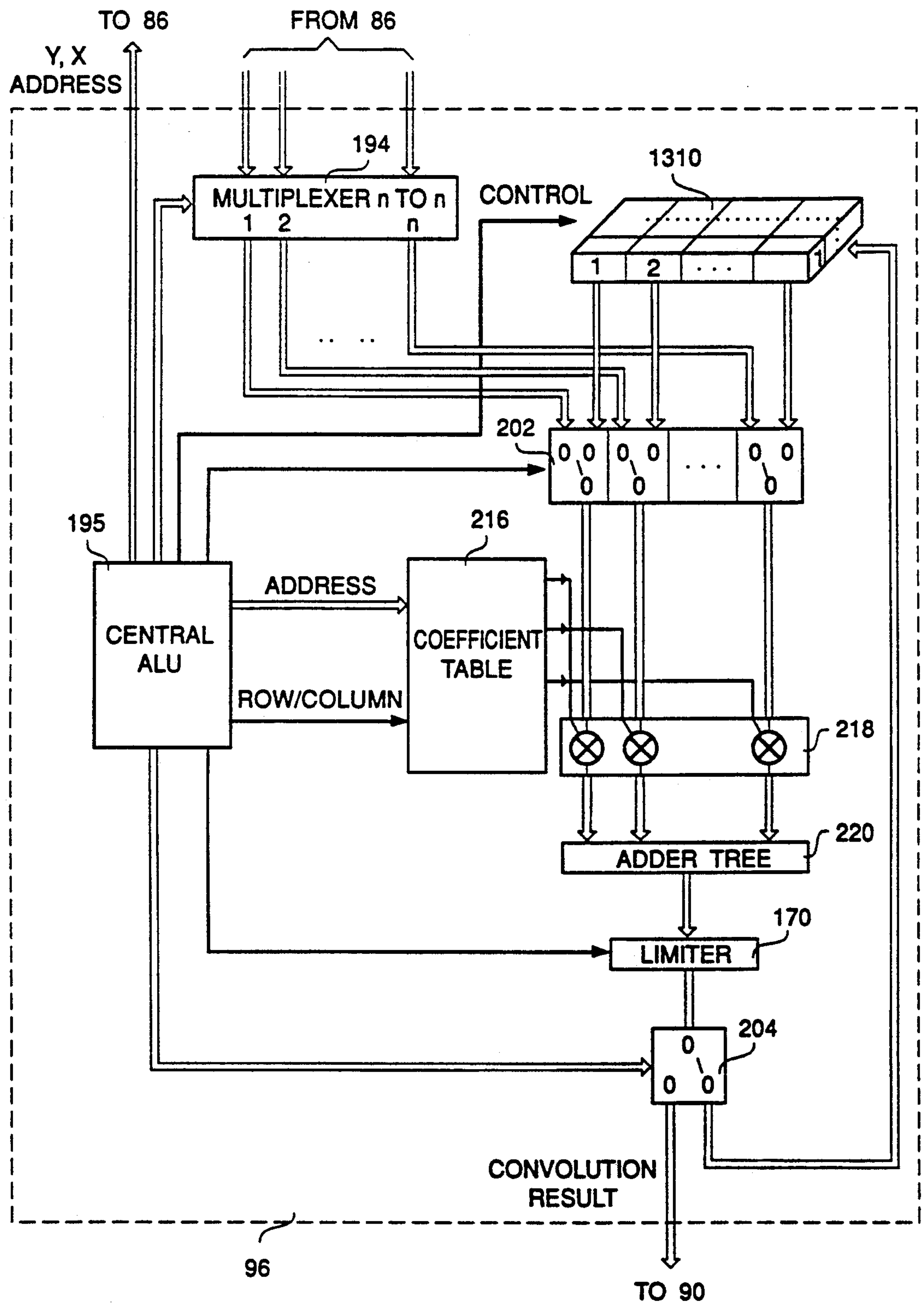
FIG. 55 is a block diagram of apparatus useful in implementing the method of FIG. 54.
Figure 56:
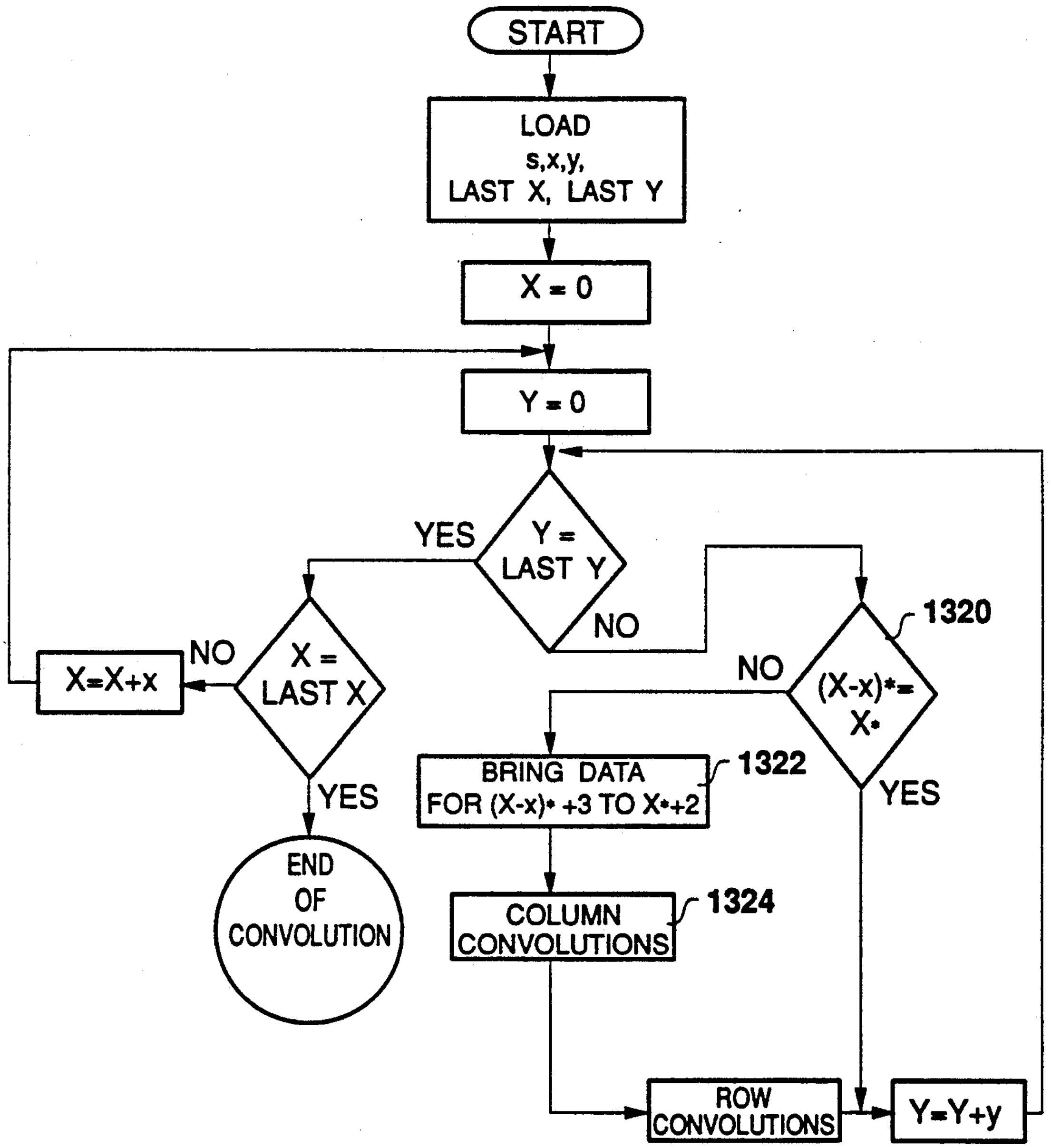
FIG. 56 is an algorithm useful in implementing the method of FIG. 54.

Reference is now made to FIG. 55, which is a block diagram of apparatus useful in implementing the method of FIG. 53, and to FIG. 56 which is an algorithm useful in implementing the method of FIG. 54.

The apparatus of FIG. 55 is similar to the apparatus of FIG. 12, except for the following difference:

The shift register array 190 is replaced by a shift register array 1310. Shift register array 1310 may comprise A shift register arrays, each of which may be substantially identical to the shift register array 190 of FIG. 12, where:

A=Y/y. If Y/y is not an integer, then it is rounded upward to obtain the value for A;

Y is the length of the image along the Y axis (10, in FIG. 54); and y is as defined above with reference to FIGS. 12 and 26.

The A shift register arrays are arranged in parallel. Central ALU is operative to select an appropriate one of the A shift register arrays, using the latch 246 enable signals and the output enable signals described above with reference to FIG. 17.

The method of FIG. 56 is the same as the method of FIG. 26, except for the following differences:

x, y, LX, last LX, last Y and Y are replaced in FIG. 56 by y, x, Y, last Y, last X and X respectively, because in FIG. 56, the convolution window travels first in the Y direction and then in the X direction, whereas in FIG. 26 the convolution window travels first in the X direction and then in the Y direction.

A decision step 1320 is added in which $(X-x)^*$ is compared to $X^*$, where * indicates the integer part of the appropriate variable. In this step, the present location along the X axis of the convolution center on the input grid is compared to the previous location along the X axis of the convolution center on the input grid. If the present and previous locations re the same, in other words, if the center of the convolution is still within the same input pixel, no new partial results need be computed and therefore, the column convolution section of the flowchart is bypassed and the algorithm proceeds directly to row convolution.

The bring data step 1322 comprises the step of brining the following columns: $(X-x)^*+3$ to $X^*+2$. This is because the columns presently required are $X^*+2$ and the four rows preceding it. However, column $(X-x)^*+2$ and all columns preceding it were already brought. In the present example, where the ratio of input resolution to output resolution is 1:1, the bring data step 1322 always comprises the step of bringing a single column of data per separation.

In the column convolution step 1324, only the columns of data which were brought in the preceding bring data step 1322 are convolved. All other columns of data need not be convolved since the column convolution results thereof are stored in SIPO array 1310.

After the row convolution step, the value of Y is updated.

Methods for convolving data comprising a plurality of separations are described in detail above with reference to FIGS. 10, 12, 16, 17, etc. Therefore, for brevity, the present discussion and the discussion below referring to FIGS. 58 and 59 do not include a reiteration of the particular features of multiple separation convolution.

If orthogonal three dimensional convolution is performed, in a first direction such as the Y direction and then in a second direction such as the X direction, and finally in a third direction such as the Z direction, there are two "layers" of partial results, namely the Y partial results, defined as:

$R_{ik}=\mathrm{sum}_j c_{.j.} p_{ijk}$ where j runs from 1 to 5; and the XY partial results, defined as:

$R_k=\mathrm{sum}_i c_{i..} R_{ik}$, where i runs from 1 to 5.

Here each $P_{ijk}$ is an input data element. It is appreciated that the choice of Y, X and Z as the first, second and third directions respectively is arbitrary.

It is appreciated that there are six different ways for the convolution window, which, in the present example is a cube, to travel over the data, corresponding to the six possible permutations of the three axes X, Y and Z. The six different ways may be referenced XYZ, XZY, YZX, ZXY and ZYX.

XYZ travel will now be defined in detail, the five other ways to travel over the data being analogously defined:

XYZ travel is defined as the convolution "cube" traveling first along the X axis, then along the Y axis and finally along the Z axis. In other words, XYZ travel means that the center of the convolution window or cube starts from an initial output element $q_{111}$ and continues as follows until a final output element $q_{MMM}$ is reached, assuming that the output image comprises M×M×M output elements:

$q_{111}, \ldots q_{M11}; q_{121}, \ldots q_{M21}; \ldots q_{1M1}, \ldots q_{MM1}$ then $q_{112}, \ldots q_{M12}; q_{122}, \ldots q_{M22}; \ldots q_{1M2}, \ldots q_{MM2}$ and so on, until $q_{11M}, \ldots q_{M1M}; q_{12M}, \ldots q_{M2M}; \ldots q_{1MM}, \ldots q_{MMM}$.

Figure 57:
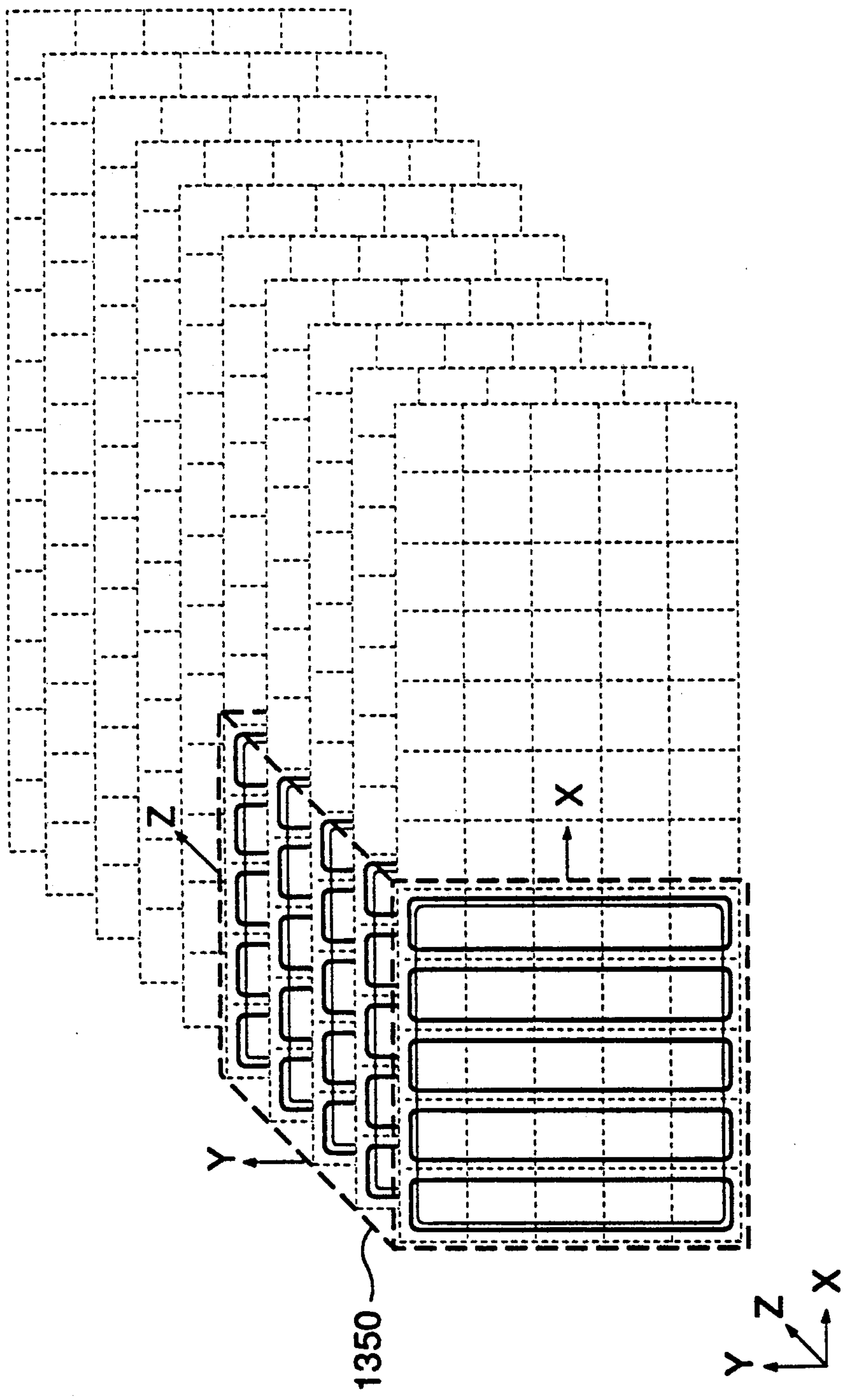
FIG. 57 is a conceptual illustration of a convolution window or cube and the three possible directions of advancement therefore.

Reference is now made briefly to FIG. 57 which illustrates a convolution window or cube 1350 and the three possible directions of advancement therefore, indicated by the three arrows X, Y and Z.

In XYZ travel, the center of the convolution cube traverses all values of X for a particular Y before advancing along the Y axis and traverses all values of Y before advancing along the Z axis. The entire convolution cube is preferably read before the center of the convolution cube advances to a different X value, in order to minimalize the number of partial results to be stored.

In all travel patterns, the Y partial results may be reused for one or more XY computations as the convolution cube travels along the X axis and the XY partial results may be reused for one or more ZXY computations as the convolution cube travels along the Z axis.

According to a preferred embodiment of the present invention, a travel pattern is selected which minimizes the amount of storage of partial results. Selection of a travel pattern in order to reduce the required partial result storage area is determined by the ratio between the number of positions along each of the three dimensions X, Y and Z. The number of positions along a particular dimensions is a function of the input resolution: output resolution ratio along that dimension, as well as the length of the color image or page along that dimension.

For example:

1. In most cases, except when the number of positions along the Y axis is relatively small, the center of the convolution cube preferably travels along the Y axis after traveling along both of the other two axes. In other words, XZY and ZXY travel patterns are both preferred to XYZ, YXZ, YZX and ZYX. This is because, in the XYZ pattern, the YX partial results must be stored for an entire Y cycle, which includes a plurality of X cycles, before being reused. In the ZYX pattern, the Y partial results must be stored for an entire Y cycle, which includes a plurality of Z cycles, before being reused. In the YXZ pattern, the Y partial results must be stored for an entire Y cycle and the YX partial results must be stored for an entire X cycle, which includes a plurality of Y cycles. In the YZX pattern, the Y partial results must be stored for an entire Z cycle, which includes a plurality of Y cycles, and the YX partial results must be stored for an entire Y cycle.

2. If the number of positions along each of the three axes is the same, then, for 5×5×5 convolution, it is preferable to store YX results, and not Y results, by traveling the X axis before the Z axis. Consequently, XZY is a better travel pattern than ZXY and YXZ is a better travel pattern than YZX. This is because for every 5 YX results which need to be stored, the 25 Y results used to compute those 5 YX results do not need to be stored.

It is appreciated that in particular applications there may be restrictions on the access to the data, such as when data is scanned in a particular direction. In these applications, instead of selecting a particular travel pattern, the definitions of the first, second and third directions in which the three dimensional convolution is performed may be selected.

Reference is made back to FIG. 28, described in detail above, which is a flowchart suitable for implementing the XYZ travel pattern described above.

In the flowchart of FIG. 28, the 2 dimensional partial results are not reused for computing successive final results which have 2 dimensional partial results in common.

Apparatus for implementing the flowchart of FIG. 28 may comprise the apparatus of FIG. 27. As explained above with reference to FIG. 27, the shift register 223 serves to store 25 Y partial results. Shift register 222 serves to store 5 YX partial results.

Figure 58:
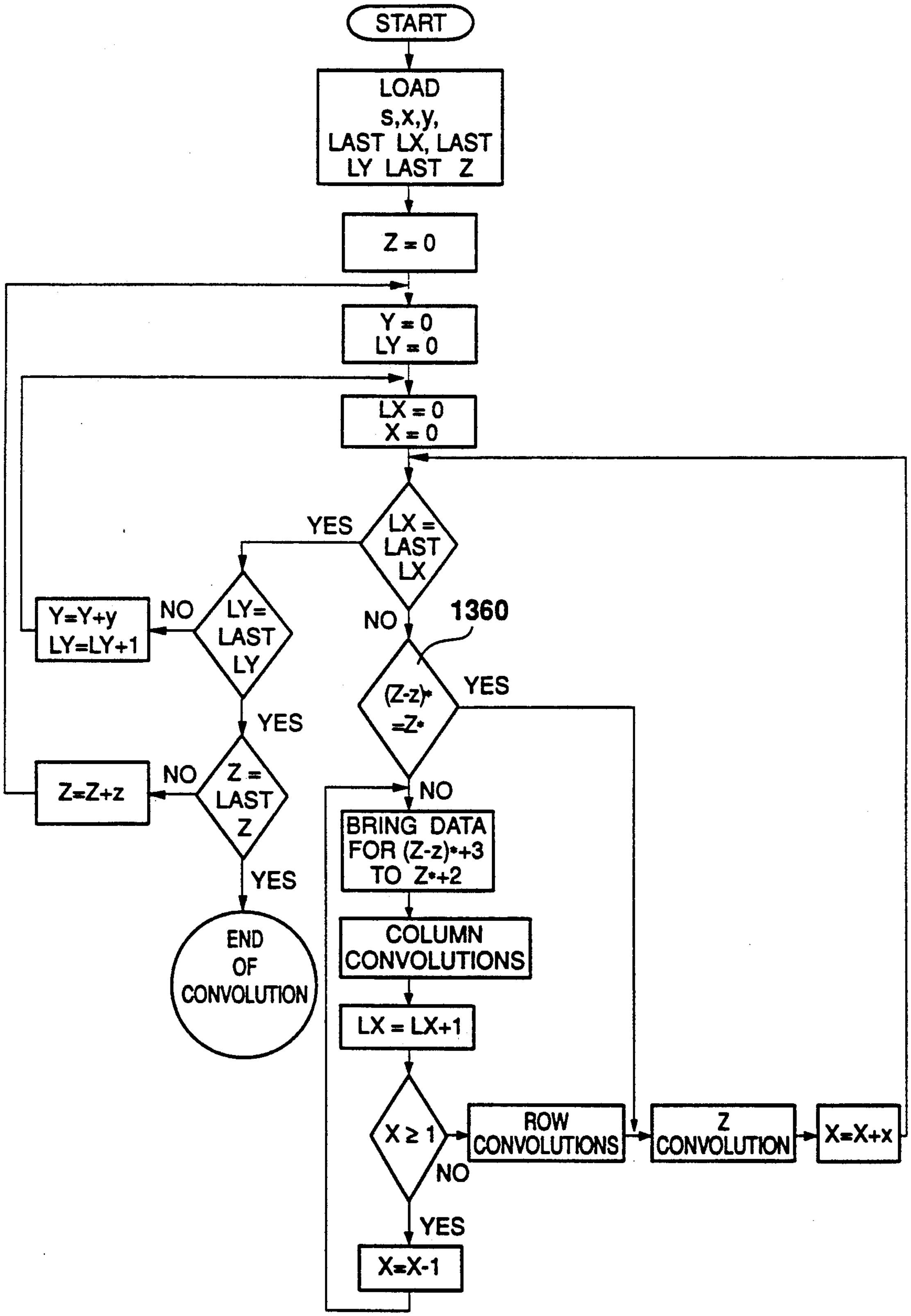
FIG. 58 is a flowchart suitable for implementing an XYZ travel pattern and for reusing 2 dimensional partial results.

Reference is now made to FIG. 58 which, like FIG. 28, is a flowchart suitable for implementing the XYZ travel pattern described above. Unlike the flowchart of FIG. 28, the 2 dimensional partial results are here reused when computing successive final results which have 2 dimensional partial results in common.

The flowchart of FIG. 58 is similar to the flowchart of FIG. 28 except that an additional decision block 1360 is added which compares the integer part of Z−z to the integer part of Z, the integer part of Z being the position along the Z axis and z is the ratio of input resolution to output resolution. In other words, z is the amount of displacement of the convolution window along the third dimension of the input pixels. If the integer part of Z−z equals the integer part of Z, no new 2 dimensional partial result need be computed and the algorithm proceeds directly to Z convolution without bringing new data and without computing a new 2 dimensional partial result. If the integer part of Z−z does not equal the integer part of Z, the algorithm proceeds as in FIG. 28.

Apparatus for implementing the flowchart of FIG. 58 may comprise the apparatus of FIG. 27. However, shift register 222 now must be replaced with a shift register large enough to store the YX partial results corresponding to an entire x cycle. In other words, shift register 222 must be replaced by a parallel array of LX/x shift registers, each of which is identical to shift register 222. If LX/x is not an integer, the number of shift registers is rounded upward from the value of LX/x. Shift register 223 serves to store 25 Y partial results, as in FIG. 27.

Figure 59:
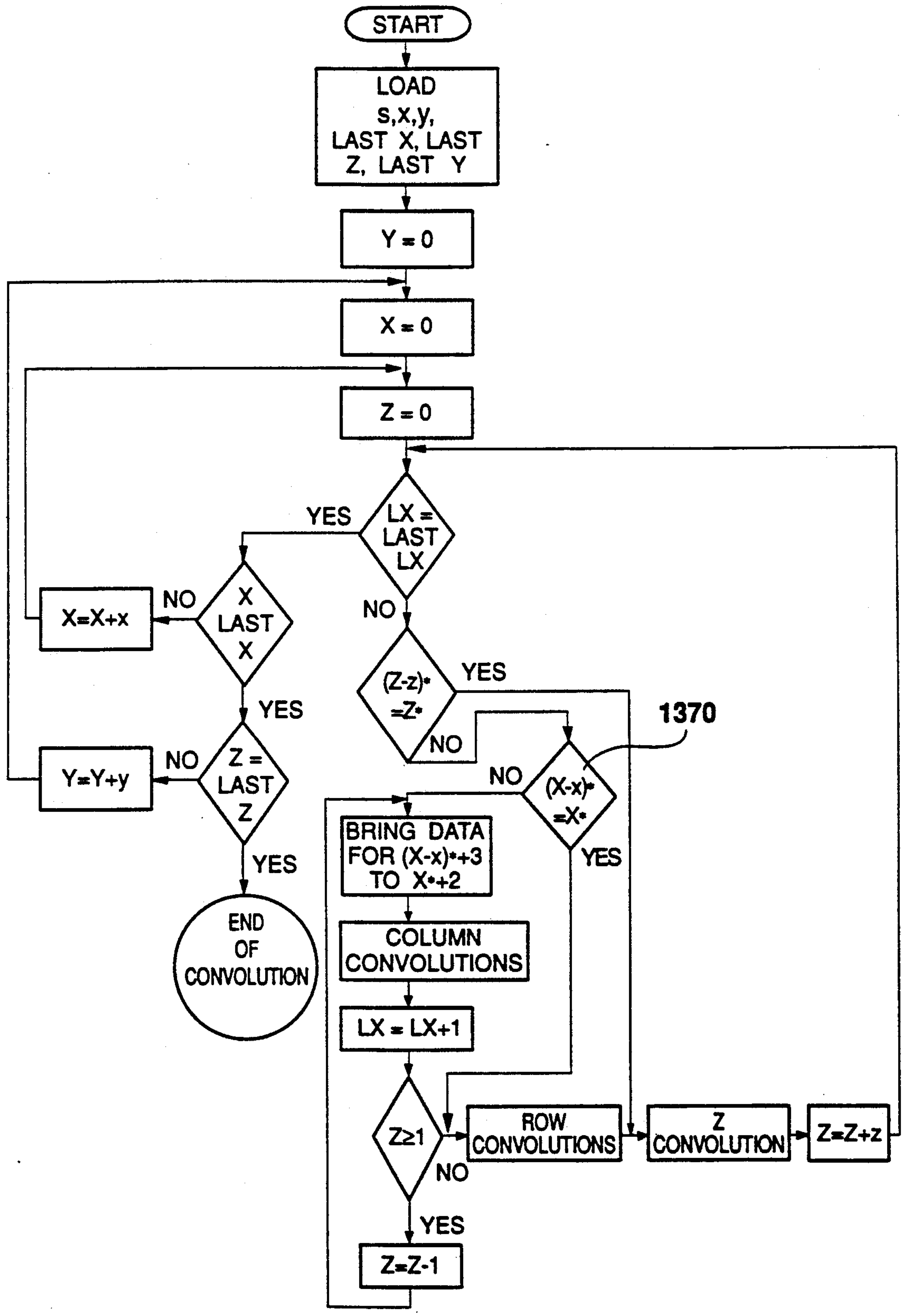
FIG. 59 is a flowchart suitable for implementing a ZXY travel pattern and for reusing 2 dimensional partial results as well as 1 dimensional partial results.

Reference is now made to FIG. 59 which is a flowchart suitable for implementing the ZXY travel pattern. As in the flowchart of FIG. 59, the 2 dimensional partial results are here reused when computing successive final results which have 2 dimensional partial results in common. However, in the flowchart of FIG. 59 the 1 dimensional partial results are also reused when computing successive 2 dimensional partial results which have 1 dimensional partial results in common. An entire Z cycle separates each pair of successive 2 dimensional partial results having 1 dimensional partial results in common. In the flowchart of FIG. 58, 1 dimensional partial results are not reused.

The flowchart of FIG. 59 is generally similar to the flowchart of FIG. 58 except for the following differences:

The roles of X, Y, Z and their respected related parameters, variables and procedures in FIG. 58 are respectively replaced by Z, X and Y in FIG. 59, because the flowchart of FIG. 58 implements a XYZ travel pattern, whereas the flowchart of FIG. 59 implements a ZXY travel pattern.

An additional decision block 1370 is added which compares the integer part of X−x to the integer part of X, where the integer part of X is the position along the x axis and x is the ratio of input resolution to output resolution. In other words, x is the amount of displacement of the convolution window along the third dimension of the output pixels. If the integer part of X−x equals the integer part of X, no new 1 dimensional partial result (column convolution) need be computed and the algorithm proceeds directly to 2 dimensional convolution (row convolution) without bringing new data and without computing a new 1 dimensional partial result. If the integer value of X−x does not equal the integer value of X, the algorithm proceeds as in FIG. 58.

Apparatus for implementing the flowchart of FIG. 59 may comprise the apparatus of FIG. 27. However, shift register 223 now must be replaced with a shift register large enough to store the Y partial results corresponding to an entire Z cycle. In other words, shift register 223 must be replaced by a parallel array of Z shift registers, each of which is identical to shift register 223. Shift register 222 serves to store 5 YX partial results, as in FIG. 27.

The above discussion of FIGS. 10, 12, 26–28 and 53–59 describes generally preferred hardware implementations of convolution apparatus which preferably have the following advantages:

orthogonal convolution computation methods are used rather than conventional convolution computation methods;

the same data manipulation unit (multipliers, adders, etc.) is used for more than one dimension of the multidimensional orthogonal convolution operation;

partial results are stored and reused rather than being computed anew, thereby to enhance the efficiency of the convolution operation;

the order of directions in which the convolution window advances, relative to the order of dimensions within each orthogonal convolution computation, is selected such that maximal reuse of partial results is provided for a given storage capacity;

multi-component data, such as color images having a plurality of separations, may be processed;

multidimensional data wherein different input resolution: output resolution ratios, or, more generally, different input density: output density ratios are defined for different axes, may be processed.

The above discussion referred, for the purposes of illustration, to 2 dimensional convolution and 3 dimensional convolution. It is appreciated that the above discussion is generalizable to convolution apparatus having any number of dimensions. Furthermore, the above discussion is generalizable to implementations, such as hardware implementation, of any separable and symmetric function such as Fourier transforms, Walsh transforms, maximum and minimum functions and other extreme value functions.

Hardware implementations of convolution having any number of dimensions is now discussed in detail with reference to the forgoing discussion.

It is appreciated from the particular examples shown and described hereinabove that a convolution algorithm may be facilitated by selecting the order of axes along which the convolution window advances, relative to the order of dimensions within each orthogonal convolution computation. Specifically, it is preferably to select a first axis along which the convolution window is to advance such that one "layer" of partial results may be reused immediately. In two dimensional convolution, there is only one "layer" of partial results and therefore there is a single axis of advancement which allows that layer of partial results to be reused immediately.

It is appreciated that the layer of partial results which corresponds to the first axis along which the convolution window advances is reused immediately. In convolution of three dimensions or more, only one of the two or more layers of partial results may be reused immediately. The remaining one or more layers of partial results must be stored. For example, in five dimensional convolution, in the best case, a first remaining layer must be stored while the convolution window advances along an axis, a second remaining layer must be stored while the convolution window advances along two axes, i.e. travels over a two dimensional array and a third remaining layer must be stored while the convolution window advances along three axes, i.e. travels over a three dimensional array.

It is appreciated that in convolution of more than two dimensions, the convolution operation may be either orthogonal, conventional, (entirely non-orthogonal) or a combination of the two. For example, in three dimensional convolution, assuming that it is feasible to perform entirely orthogonal convolution, it is preferable to perform entirely orthogonal convolution rather than partially orthogonal convolution. Similarly, if partially orthogonal convolution is feasible and entirely orthogonal convolution is not, partially orthogonal convolution is preferable over conventional, non-orthogonal convolution.

In the above paragraph, "entirely orthogonal convolution", "partially orthogonal convolution" and "non-orthogonal convolution" refer respectively to the following types of computation, using 5×5×5 three dimensional convolution as an example and using the notation developed above:

Orthogonal convolution:

Compute $R=\text{sum}_k c_{..k} R_k$, where k runs from 1 to 5, where each $R_k$ is computed as follows: $R_k=\text{sum}_i c_{i..} R_{ik}$, where i runs from 1 to 5, and where each $R_{ik}$ is computed as follows: $R_{ik}=\text{sum}_j c_{.j.} p_{ijk}$ where j runs from 1 to 5.

Partially orthogonal convolution:

In three dimensional convolution, there are two types of partially orthogonal convolution:

2+1 convolution:

Compute $R=\text{sum}_k c_{..k} R_k$, where k runs from 1 to 5, where each $R_k$ is computed as follows: $R_k=\text{sum}_{i,j} c_{ij.} p_{ijk}$, where i and j run from 1 to 5.

1+2 convolution:

Compute $R=\text{sum}_{i,k} c_{i.,} R_{ik}$, where i and k run from 1 to 5, and where each $R_{ik}$ is computed as follows: $R_{ik}=\text{sum}_j c_{.j.} p_{ijk}$.

Non-orthogonal convolution:

Compute $R=\text{sum}_{ijk} c_{ijk} p_{ijk}$

The coefficients are interrelated as follows: For all i, j and k:

$c_{ijk}=c_{i..} \times c_{.j.} \times c_{..k}$;

$c_{ij.}=c_{i..} \times c_{.j.}$;

$c_{i.k}=c_{i..} \times c_{..k}$; and $c_{.jk}=c_{.j.} \times c_{..k}$.

It is appreciated that the number of types of partially orthogonal convolution types increases as the dimension of the convolution increases. For 2 dimensional convolution, there is one type of partially orthogonal convolution. For 3 dimensional convolution, there are two types of partially orthogonal convolution, termed above 1+2 convolution and 2+1 convolution. For 4 dimensional convolution, the following types of partially orthogonal convolution exist, using terminology analogous to that used to define the two types of 3 dimensional convolution: 1+3, 3+1, 2+2, 1+1+2, 1+2+1 and 2+1+1.

Partially orthogonal convolution computations are useful when fully orthogonal convolution is unsuitable. For example, the input data elements may be stored such that the type of access required for a fully orthogonal convolution process is impractical. Also, the convolution coefficients may be only partially "factorable". For example, in a particular 3 dimensional convolution application, it may be possible to define $c_{ij.}$ and $c_{..k}$ such that, for all i,j,k: $c_{ijk}=c_{ij.} \times c_{..k}$ The apparatus and methods shown and described above in FIGS. 12, 26–28 and 53–59 have the advantage of reducing the number of operations by reuse of partial results while requiring relatively litter storage space despite the need to store all but one layer of partial results. This is because the structure of the apparatus, and particularly the structure of the SIPO and the cyclic permutation introducing multiplexer, require a relatively small portion of the image to be accessible at any one time, without complicated data management processes. Also, less coefficients need be stored. In other words, the apparatus of FIGS. 12, 26–28 and 53–59 enhance the efficiency of orthogonalized or partially orthogonalized convolution relative to partially orthogonalized or non-orthogonal, conventional convolution.

It is appreciated that the virtual arrangement of digital data in a multidimensional array need not have a physical counterpart in the physical phenomenon represented by the digital data. For example, pixels representing a two dimensional color image may be virtually arranged in a two dimensional array comprising twos and column. In this example, each row or column of the two dimensional array of digital data corresponds to a physical row or column which is perceived by an observer of the physical picture. However, the plurality of pixels representing a single row of the color image may, if advantageous, be virtually arranged as a multidimensional array even though that multidimensional array has no physical counterpart. For example, if a single row of a color image is represented by 100 pixels $p_1$, 1 1 1 $p_{100}$, the row may be arranged into a 10×10 array in which the jth row is $p_{10(j-1)+1}, \ldots p_{10(j-1)+10}$.

Representation of data as a multidimensional array allows orthogonalized convolution processes to be employed. This has the advantage of allowing a convolution kernel to be used which is larger than the size of the convolution computing unit. For example, using the adder tree of FIG. 12, a kernel of size up to $5^k$ may be employed if k−1 storage units such as SIPO registers are provided for the k−1 layers of partial results. When the partial results are convolved, the coefficients may be all 1's. Alternatively, the coefficients may be determined by factoring the polynomial corresponding to the kernel of convolution coefficients into smaller degree polynomials as explained in the above-referenced text by Nussbaumer.

General hardware implementation of separable and symmetric functions such as Fourier transforms, Walsh transforms, Hadamard transforms, discrete cosine transforms, maximum and minimum functions and other extreme value functions, as well as convolution, are now discussed with reference to the forgoing discussion.

Separable and symmetric functions such as fast Fourier transforms (FFT) and convolution are discussed in the following documents, the disclosures of which are incorporated herein by reference:

Gonzalez and Wintz, *Digital Image Processing,* 1987, particularly the pages appended hereto as Appendix T; and Nussbaumer, *Fast Fourier Transform and Convolution Algorithms,* Springer-Verlag, Berlin, 1980.

Figure 60:
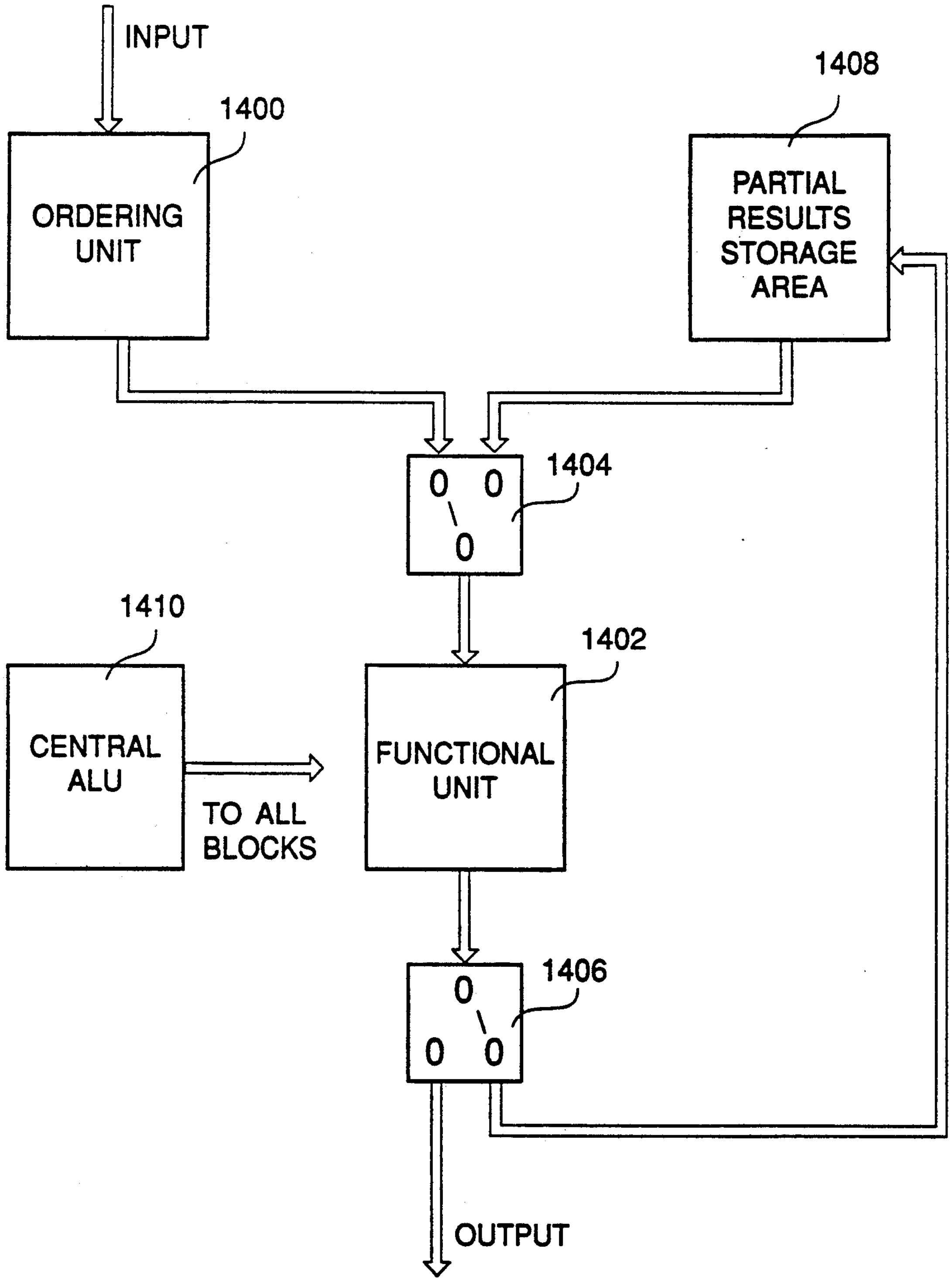
FIG. 60 is a block diagram of apparatus for operating a separable and symmetric function on a body of data.

Reference is now made to FIG. 60, which is a block diagram of general apparatus for operating a separable and symmetric function on a body of data. Since the function (termed herein "the first function") is separable and symmetric, operating the function on the body of data is mathematically equivalent to operating a second function on the body of data and operating a third function, functionally equal to the second function, on the results of the second function. The results of the second function are termed herein "partial results" or "the first layer of partial results".

More generally, the apparatus of FIG. 60 may also be employed for operating a fourth function, functionally equal to the second and third functions, on the results of the third function, and for similarly operating fifth, sixth, seventh, . . . functions, all functionally equal to one another and to the preceding functions, up to any desired number of functions. The results of the third, fourth, fifth, sixth, . . . functions are termed "the second, third, fourth, fifth, . . . layers of partial results", respectively.

The apparatus preferably comprises a data ordering unit 1400, a functional unit 1402, input and output switches 1404 and 1406 respectively, associated with the functional unit 1402, and a partial results storage area 1408. A central ALU 1410 controls all units.

The data ordering unit 1400 receives a plurality of streams of data corresponding in number to a plurality of positions in an imaginary "window" upon which the second function operates. The data ordering unit is operative to reorder the plurality of current data elements provided by the plurality of data streams such that each data stream provided to input switch 1404 continually corresponds to a particular position within the window. According to a preferred embodiment of the invention, the data ordering unit comprises a cache for storing raw data elements. The raw data elements in the cache may be used to compute more than one "first layer" partial result.

The functional unit 1402 operates the second function on the raw data arriving from ordering unit 1400 and operates the third function on the partial results data arriving from storage means 1408. The functional unit 1402 also preferably stores and/or computes any parameters such as coefficients required for the second and third functions.

The input switch 1404 has a first position (shown), corresponding to the raw data, which allows the functional unit 1402 to receive raw data via ordering unit 1400, and a second position (not shown), corresponding to the partial results data, which allows the functional unit 1402 to receive partial results data from partial results storage area 1408.

The output switch 1406 has a first position (shown), which allows the functional unit 1402 to provide partial results data to storage area 1408, and a second position (not shown), which allows the functional unit 1402 to output final results.

Partial results storage area 1408 preferably comprises a plurality of arrays, each operative to store one of the layers of partial results. The arrays of partial results are preferably addressed by central ALU 1410. Each array of partial results is preferably structured such that each position therewithin, which normally stores a partial result of a particular kth layer, continually corresponds to a particular position within an imaginary window upon which the (k+1)th function operates. Each array of partial results is also preferably structured and managed such that partial results which are still needed are not overwritten, whereas partial results which are no longer needed are overwritten almost immediately.

Central ALU 1410 is also operative to synchronize the system of FIG. 60, introducing necessary delays, preferably by controlling the flow of information through partial results storage area 1408 and ordering unit 1400. Central 1410 is also operative to control the pipeline by controlling the operation of switches 1404 and 1406. Management and ordering of the pipeline segments may be implemented using well known principles of the art such as those described in *Computer Architecture and Parallel Processing,* Hwang and Briggs, McGraw Hill, 1984, the disclosure of which is incorporated herein by reference.

According to a preferred embodiment of the invention, the ordering unit 1400 and the partial results storage area 1408 are operative to channel edge data so as to overcome missing data at the edge of the processed data, as explained above in detail in connection with convolution apparatus. Similar techniques may be used to overcome other types of missing data.

The term "complementary subset" as used in the present specification and claims with relation to a subset A of a particular set B refers herein to the set of all members of B which are not members of subset A.

It will be appreciated by persons skilled in the art that the color image processing apparatus and techniques shown and described herein are not limited to processing of any particular color image representation format, such as CT/LW format.

It will be appreciated by persons skilled in the art that there have been described hereinabove apparatus and techniques for information storage and apparatus and techniques for carrying out convolution whose applications are not limited to graphics applications.

It will be appreciated by persons skilled in the art that the present invention is not limited to what has been particularly shown and described hereinabove. Rather, the scope of the present invention is defined only by the claims which follow:

APPENDICES

The following appendices are appended hereto:

Appendix A is a software embodiment of the color processing means 14 of FIG. 1, constructed and operative in accordance with a preferred embodiment of the present invention.

Appendix B is a software embodiment of the spatial processing means 12 of FIG. 1, constructed and operative in accordance with a preferred embodiment of the present invention.

Appendix C is a complete copy of a coassigned Israel Patent Application, the disclosure of which is incorporated herein by reference.

Appendix D whose material is incorporated by reference to 650,461 is a netlist generated by a VLSI generating software package commercially available from LSI LOGIC, 1551 McCarthy Blvd., Milpitas, Calif., 95035. This netlist is a complete description of spatial processing unit 1026 of FIG. 42.

Appendix E is a netlist generated by a VLSI generating software package commercially available from LSI LOGIC, 1551 McCarthy Blvd., Milpitas, Calif., 95035. This netlist is a complete description of color subunit 1052 of FIG. 42.

Appendix F is a EPM 5128 netlist generated by a component generating software package commercially available under the mark MAXPLUS from Altera, 2610 Orchard Parkway, San Jose, Calif., USA. This netlist is a complete description of the control component 1132 of LW buffer 1022 of FIG. 42.

Appendix G is a EPM 5128 netlist generated by a component generating software package commercially available under the mark MAXPLUS from Altera, 2610 Orchard Parkway, San Jose, Calif., USA. This netlist is a complete description of the control component 1140 of output buffer 1054 of FIG. 42.

Appendix H is a EPM 5128 netlist generated by a component generating software package commercially available under the mark MAXPLUS from Altera, 2610 Orchard Parkway, San Jose, Calif., USA. This netlist is a complete description of the cyclic multiplexer whose operation is described in FIG. 19.

Appendix I is a EPM 5192 netlist generated by a component generating software package commercially available under the mark MAXPLUS from Altera, 2610 Orchard Parkway, San Jose, Calif., USA. This netlist is a complete description of the control component 1136 of lines buffer 1024 of FIG. 42.

Appendix J is a netlist generated by a component generating software package commercially available under the mark ACE from Daizix. This netlist is a complete description of the following components of FIG. 42: host interface 1020, FIFO 1034, FIFO 1306, LW processing memory 1038, memory 1040, memory 1050, LW buffer video RAM component 1130, the lines buffer video RAM component 1134, the output buffer video RAM component 1138, and the interconnections of all the above components to one another as shown in FIG. 42 as well as their interconnections to the following units of FIG. 42: LW processing unit 1032, color subunit 1052, the LW buffer control component 1132, the lines buffer control component 1136, the output buffer control component 1140. The netlist interconnects off-the-shelf components, a list of which forms part of Appendix J.

Appendix J includes mention of an EPM5128 component located at physical location EF24. This component may be disregarded.

Appendix J also includes mention of the following components, located at the following physical locations. The following chart is intended to indicate the appendices which relate to each of these components.

| Component | Physical location | Appendix |
|---|---|---|
| EPM5128 | BC11 | F |
| EPM5128 | L24 | G |
| EPM5128 | EF17 | H |
| EPM5192 | BC17 | I |
| DP96002 | BC7 | K |
| PAL22V10A | H5 | L |
| PAL22V10A | H7 | M |
| PAL22V10A | H4 | N |
| PAL22V10A | EF7 | O |
| PAL22V10A | H6 | P |
| PAL22V10A | A5 | Q |
| PAL22V10A | A6 | R |
| PAL22V10A | EF8 | S |
| CBX | A25 | E |

Appendix K whose material is incorporated by reference to 650,461 is a computer listing of software which, when used in conjunction with the DSP 96002, commercially available from Motorola, forms a complete implementation of a preferred embodiment of the LW processing unit 1032.

Appendices L–S are computer listings of eight PAL components of Appendix J. Each PAL component comprises a 22V10, commercially available from AMD.

Appendix T whose material is incorporated by reference to 650,461 is an excerpt from a textbook entitled *Digital Image Processing* by Gonzalez and Wintz, 1987.

APPENDIX A

```
Dump of file U$PLOT:[YACOV.V4.SUBSYSTEM.PATENT.SRC]COLOR.OUT;1
on 19-FEB-1990 17:25:15.92
File ID (196,24,0)   End of file block 151 / Allocated 153

Virtual block 512 (0200) bytes

 66490000 B2E40000 0BC60000 001C0000 D0EB0000 14E20000 D89000B9 020601FE
 04000000 01A00000 08000000 00000000 00000000 00000000 00000000 0000086F
 00000000 00000000 00000000 00000000 00000000 00140000 02010000 00400000
 00000000 00000000 00000000 00000000 000FFFF0 00001000 00030000 00000000
 00000000 00000000 00000000 00000000 00000000 00000000 00000000 00000000
 45505041 4D203638 32585041 69143633 3A35313A 37313039 2F39312F 32300000
 00000000 000D7200 00000200 008A9C00 00000F00 01CC5A7F F4322E33 56202C52
 00000000 00000000 00000000 00000000 00000000 00000000 00000000 00000000
 00000000 00000000 00000000 00000000 00000000 00000000 00000000 00000000
 00000000 00000000 00000000 00000000 00000000 00000000 00000000 00000000
 00000000 00000000 00000000 00000000 00000000 00000000 00000000 00000000
 00000000 00000000 00000000 00000000 00000000 00000000 00000000 00000000
 00000000 00000000 00000000 00000000 00000000 00000000 00000000 00000000
 00000000 00000000 00000000 00000000 0000000C 00000000 00000000 00000000
```

| | | | | | | | |
|---|---|---|---|---|---|---|---|
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 000001FE |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 14E00000 | 9A000000 | D8200000 | 92000000 | 003F0000 | 00000000 | 00000000 | 000001FE |
| 00020000 | 9A000000 | 001C0000 | 9A000000 | 00540000 | 92000000 | D0E50000 | 92000000 |
| 00000000 | 00000000 | 00000000 | 00000000 | 00000000 | 00000000 | 00000000 | 92000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 000001FE |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00010000 | 00000000 | 00000000 | 000001FE |
| 00000000 | 00000000 | 00000000 | 00000000 | 00020000 | 00000000 | 00000000 | 00000000 |
| 00000000 | D8210000 | D8200000 | 0C000000 | 00148008 | 00010000 | 00000000 | 00000000 |
| 00000000 | 14E10000 | 14E00000 | E8000000 | 001C8000 | 00020000 | 00000000 | 00000000 |
| 00000000 | D0E60000 | 00000000 | 00000000 | 00248000 | 00020000 | 00000000 | 00000000 |
| 00000000 | 00550000 | 00540001 | 00000000 | 002C8008 | 00010000 | 00000000 | 00000000 |
| 00000000 | 001D0000 | 001C0001 | 04000000 | 00348008 | 00010000 | 00000000 | 00000000 |
| 00000000 | 00030000 | 00020001 | 08000000 | 003C8000 | 00020000 | 00000000 | 00000000 |
| 00000000 | 002C0000 | 002C0001 | 08020000 | 00090000 | 00410000 | 00000000 | 00000000 |
| 00000000 | 0BC60000 | 0BC60001 | 082E0000 | 000A0000 | 00420000 | 00000000 | 00000000 |
| 00000000 | 00580000 | 00580001 | 13F40000 | 000B0000 | 00430000 | 00000000 | 00000000 |
| 00000000 | 001C0000 | 001C0001 | 144C0000 | 000C0000 | 00440000 | 00000000 | 00000000 |
| 00000000 | 18000000 | 18000001 | 14680000 | 000D0000 | 00450000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00C00000 00000000 00000000 00000000 00000000 00000000 00000000 00000000

C4830014 D3B79A01 6A200068 0002A0C8 57560000 00000000 00000000 000001FE
830014C0 BE9A220C 68046A00 6A006A00 6A1975FC 460BFE46 8BFE5689 FC468904
0005FE56 8BFC468B 02558905 8916E03E C52EFE56 8BFC468B 054CE9FF FFB80AC4
468B0255 89058916 E83EC52E 040005FE 568BFC46 8B025589 058916E4 3EC52E02
8916F03E C52E0800 05FE568B FC468B02 55890589 16EC3EC5 2E060005 FE568BFC
0C0005FE 568BFC46 8B025589 058916F4 3EC52E0A 0005FE56 8BFC468B 02558905
FC468B02 55890589 16FC3EC5 2E0E0005 FE568BFC 468B0255 89058916 F83EC52E
05891704 3EC52E12 0005FE56 8BFC468B 02558905 8917003E C52E1000 05FE568B
2E160005 FE568BFC 468B0255 89058917 083EC52E 140005FE 568BFC46 8B025589
8BFC468B 02558905 8917103E C52E1800 05FE568B FC468B02 55890589 170C3EC5
89058917 183EC52E 1C0005FE 568BFC46 8B025589 05891714 3EC52E1A 0005FE56
76FF1476 FF50FD8E 868D1602 55890589 171C3EC5 2E1E0005 FE568BFC 468B0255
2E016A04 6A501E74 00FD8CBE 83FD8C86 890CC483 001405B8 9A0E76FF 1076FF12
7416463B FDB6868B 03DCE9FD 8C868B0A C4830014 16D69A17 2036FF2E 172236FF
0FFD6C86 C7058917 243EC52E FDBA868B FE5FE903 7418463B FDB8868B FE6BE903
9BE8D99B 00E1E903 7C04FD88 BE830000 FD8886C7 0007FD6C 86C70674 003D8300

FD6C8623 E0D3FD8A 8E8B0001 B83A7D04 FD8ABE83 0000FD8A 86C7FD68 9ED901FE
BC85D99B FE031F16 FD0304E7 C1FD88BE 8B02E6C1 FD8AB68B E4EBFD8A 86FF0675
8EDC9BFD 6886D99B FD609EDD 9B172806 DF2E9BD5 EBFD689E D99BFD68 AED89BFD
3EC52EFD 7685891F 16FD03E7 D1FD88BE 8B08C483 0014B413 9A0014B3 B39AFD60
E8D99B07 16F50304 E6C1FD88 B68BFD60 9EDD9B17 2806DF2E 9B417400 3D831724
FD03E7D1 FD88BE8B 08C48300 14B4139A 0014B3B3 9AFD608E DC9BFDC8 A4D8269B
C7FF15E9 FD8886FF 0000FD6E 85C71F16 FD03E7D1 FD88BE8B 10EBFD6E 85891F16
858906E0 C1FD7E86 8B1F16FD 03E7D1FD 7EBE8B1B 7D0100FD 7EBE8100 00FD7E86
037C04FD 8ABE8300 00FD8A86 C7014DE9 03750A46 0B0C468B DDEBFD7E 86FFFDFC
006A0E74 00FD8CBE 83E2EBFD 8A86FF06 75164623 E0D3FD8A 8E8B0001 B8013DE9
FD888E8B 0001B8D8 7D04FD88 BE830000 FD8886C7 FCF0E922 5268046A 006A006A
8BFD8686 8908E0C1 FD8A8603 02E0C1FD 88868BE5 EBFD8886 FF067518 4623E0D3
868D1600 14B3B39A FDBC85D9 9BFE031F 16FD0304 E7C1FD88 BE8B02E6 C1FD8AB6
03E7D1FD 88BE8B10 C4830014 08099A50 52FE568B FC4603E0 D1FD8686 8B50FDFC
4603E0D1 FD86868B FD76B5FF 1F16FD03 E7D1FD88 BE8B3474 00FD76BD 831F16FD
BE830000 FD7685C7 1F16FD03 E7D1FD88 BE8B06C4 83001408 729A5052 FE568BFC

16FD03E7 D1FD88BE 8BFF52E9 0375003D 8317243E C52EFF5F E9037403 FD8A01FE
03E0D1FD 86868BFD 6EB5FF1F 16FD03E7 D1FD88BE 8BFF3EE9 037500FD 6EBD831F
E90000FD 6E85C71F 16FD03E7 D1FD88BE 8B06C483 00140872 9A5052FE 568BFC46
3EC52E04 C4830014 D3B79A01 6A52FD80 96891A56 03172A3E F72E991A 468BFF07
86C70000 FD8286C7 0000FD84 86C7FBA1 E90375FC 460BFE46 8B025589 0589172C
8B17321E 8E2E1730 3E032EF8 8B0AFD8A 866B00E8 E9037C04 FD8ABE83 0000FD8A
45C71730 3E032EF8 8B0AFD8A 866B2475 164623E0 D3FD8A8E 8B0001B8 05891A46
3E032EF8 8B0AFD8A 866B31EB 00000645 C717303E 032EF88B 0AFD8A86 6B000002
8B064589 FD84868B 17303E03 2EF88B0A FD8A866B 00010245 C717321E 8E2E1730
303E032E F88B0AFD 8A866B29 75184623 E0D3FD8A 8E8B0001 B8FD8486 01FD8086
866B31EB 00000845 C717303E 032EF88B 0AFD8A86 6B000004 45C71732 1E8E2E17
17303E03 2EF88B0A FD8A866B 00010445 C717321E 8E2E1730 3E032EF8 8B0AFD8A
555756CB 5E5FC99B C02BFF0E E9FD8A86 FFFD8286 01FD8086 8B084589 FD82868B
F99A35FF 0275FF17 2C3EC52E 04C48300 14D3F99A 35FF0275 FF16E03E C52EEC8B
14C77B9A 1276FF14 76FF0000 FF7E86C7 000082C8 5756CB5E 5FC904C4 830014D3
C5017FE9 173436FF 2E173636 FF2E036A 026A5012 7400807E 83804689 04C48300
```

469A50F1 468D160E 76FF1076 FF0178E9 C02B0575 203D8005 74003D80 0E7E01FE
520CC483 00147F11 9A0A76FF 0C76FF50 EE468D16 026AFF6A 126A08C4 830014D7
36FF2E00 9EE90375 00807E83 80468990 468B0AC4 830014B4 EA9A5082 468D1650
00147BD2 9A509A46 8D16066A 08C48300 14D7469A 509D468D 16173836 FF2E173A
6A501274 00807E83 80468998 468B0AC4 830014B4 EA9A5094 468D1650 5204C483
EE468D16 026AFF6A 126A0001 FF7E86C7 00D0E917 3C36FF2E 173E36FF 2E036A03
90468B0A C4830014 B4EA9A50 82468D16 50520CC4 8300147F 119A509A 468D1650
5080468D 160085E9 174036FF 2E174236 FF2E036A 046A5012 7400807E 83804689
6A056A80 76FF1374 00807E83 0CC48300 14A65C9A 8276FF84 76FF1276 FF1476FF
807E8380 468904C4 8300147F E99A5082 468D1653 EB174436 FF2E1746 36FF2E03
509A468D 162D7400 FF7EBE83 2CEB1748 36FF2E17 4A36FF2E 036A066A 50117400
174C36FF 2E174E36 FF2E036A 076A5017 7400807E 83804689 04C48300 147C0E9A
FF175036 FF2E1752 36FF2E00 0004C857 56CB5E5F C980468B 0AC48300 1416D69A
0014050A 468B0C76 FF175436 FF2E1756 36FF2E08 C4830014 D7469A0A 76FF0C76
0000FE46 C700002C 45C70000 2A45C700 002845C7 0A7EC508 C4830014 D7469A50
0A7E0304 E7C1FE7E 8B02E6C1 FC768B20 7D04FC7E 830000FC 46C7307D 04FE7E83

56CB5E5F C99BC02B CAEBFE46 FFDAEBFC 46FF2E5D D99BEED9 9BFE030C 5E8E01FE
E7D1FE7E 8BF65EDD 9B176006 DF2E9B52 7D0100FE 7E810000 FE46C700 000AC857
14D7A09A 0014B3B3 9A175806 DC2E9BF6 76DC9B12 4EDC9B05 DF9B105E 8E0E7E03
46FF0589 0C5E8E0A 7E03E7D1 FE7E8B08 C4830014 B4139A00 14B3B39A 08C48300
03E7D1FE 7E8B157D 0100FE7E 810000FE 46C70000 02C85756 CB5E5FC9 9BA7EBFE
058B1730 3EC52E00 0014C857 56CB5E5F C9E4EBFE 46FF0501 0E468B0C 5E8E0A7E
46890255 8B058B17 2C3EC52E 0AEB0C56 8B0A4603 06458B0B 7400027D 83EE4689
8B172C3E C52E0AEB 0C568B0A 46031045 8B0B7400 0C7D8317 303EC52E FE5689FC
0AEB0C56 8B0A4603 1A458B0B 7400167D 8317303E C52EFA56 89F84689 02558B05
46032445 8B0B7400 207D8317 303EC52E F65689F4 46890255 8B058B17 2C3EC52E
4674003D 8317243E C52EF256 89F04689 02558B05 8B172C3E C52E0AEB 0C568B0A
46FFF656 8BF4468B 5052F046 FFF2568B F0468B7F 7DEE463B EC468B00 00EC46C7
C4830014 0E0E9A50 52FC46FF FE568BFC 468B5052 F846FFFA 568BF846 8B5052F4
468B5052 F046FFF2 568BF046 8B397DEE 463BEC46 8B0000EC 46C7BFEB EC46FF10
9A5052FC 46FFFE56 8BFC468B 5052F846 FFFA568B F8468B50 52F446FF F6568BF4
DE468905 8B17303E C52E0000 24C85756 CB5E5FC9 BFEBEC46 FF10C483 00140C0A

FC468902 558B058B 172C3EC5 2E0AEB0C 568B0A46 0306458B 0B740002 7D8301FE
058B172C 3EC52E0A EB0C568B 0A460310 458B0B74 000C7D83 17303EC5 2EFE5689
2E0AEB0C 568B0A46 031A458B 0B740016 7D831730 3EC52EFA 5689F846 8902558B
0A460324 458B0B74 00207D83 17303EC5 2EF65689 F4468902 558B058B 172C3EC5
0B740004 7D831730 3EC52EF2 5689F046 8902558B 058B172C 3EC52E0A EB0C568B
17303EC5 2EEE5689 EC468902 558B058B 172C3EC5 2E0AEB10 568B0E46 0308458B
5689E846 8902558B 058B172C 3EC52E0A EB10568B 0E460312 458B0B74 000E7D83
558B058B 172C3EC5 2E0AEB10 568B0E46 031C458B 0B740018 7D831730 3EC52EEA
3EC52E0A EB10568B 0E460326 458B0B74 00227D83 17303EC5 2EE65689 E4468902
3BDC468B 0000DC46 C7757400 3D831724 3EC52EE2 5689E046 8902558B 058B172C
E8468B50 52E446FF E6568BE4 468B5052 E046FFE2 568BE046 8B00D7E9 037CDE46
468B5052 F046FFF2 568BF046 8B5052EC 46FFEE56 8BEC468B 5052E846 FFEA568B
9A5052FC 46FFFE56 8BFC468B 5052F846 FFFA568B F8468B50 52F446FF F6568BF4
FFE2568B E0468B65 7DDE463B DC468B00 00DC46C7 90EBDC46 FF20C483 00141322
EE568BEC 468B5052 E846FFEA 568BE846 8B5052E4 46FFE656 8BE4468B 5052E046
568BF846 8B5052F4 46FFF656 8BF4468B 5052F046 FFF2568B F0468B50 52EC46FF

93EBDC46 FF20C483 0014111E 9A5052FC 46FFFE56 8BFC468B 5052F846 FFFA01FE
7EC5FC46 89E42A05 8A0E7EC5 FE4689E4 2A058A0A 7EC50000 08C85756 CB5E5FC9
263F0326 E7D1FE7E 8B16E01E C42EF846 89E42A05 8A167EC5 FA4689E4 2A058A12
FA7E8B16 E81EC42E 3503025F 8E263F03 26E7D1FC 7E8B16E4 1EC42E35 8B025F8E
F60B3503 025F8E26 3F0326E7 D1F87E8B 16EC1EC4 2E350302 5F8E263F 0326E7D1
8B07EBFF 05C60A7E C5087E00 FFFE81F0 8B02F8C1 C68B1CEB 0005C60A 7EC5087D
7E8B16F4 1EC42E35 8B025F8E 263F0326 E7D1FE7E 8B16F01E C42E0588 0A7EC5C6
2E350302 5F8E263F 0326E7D1 FA7E8B16 F81EC42E 3503025F 8E263F03 26E7D1FC
C68B1CEB 0005C60E 7EC5087D F60B3503 025F8E26 3F0326E7 D1F87E8B 16FC1EC4
8B17001E C42E0588 0E7EC5C6 8B07EBFF 05C60E7E C5087E00 FFFE81F0 8B02F8C1
3503025F 8E263F03 26E7D1FC 7E8B1704 1EC42E35 8B025F8E 263F0326 E7D1FE7E
3F0326E7 D1F87E8B 170C1EC4 2E350302 5F8E263F 0326E7D1 FA7E8B17 081EC42E
C5087E00 FFFE81F0 8B02F8C1 C68B1CEB 0005C612 7EC5087D F60B3503 025F8E26
8B025F8E 263F0326 E7D1FE7E 8B17101E C42E0588 127EC5C6 8B07EBFF 05C6127E
0326E7D1 FA7E8B17 181EC42E 3503025F 8E263F03 26E7D1FC 7E8B1714 1EC42E35
7EC5087D F60B3503 025F8E26 3F0326E7 D1F87E8B 171C1EC4 2E350302 5F8E263F

```
C5C68B07 EBFF05C6 167EC508 7E00FFFE 81F08B02 F8C1C68B 1CEB0005 C61601FE
2A058A0E 7EC5FE46 89E42A05 8A0A7EC5 000010C8 5756CB5E 5FC9C02B 0588167E
FA7E8B16 E81EC42E F84689E4 2A058A16 7EC5FA46 89E42A05 8A127EC5 FC4689E4
8B025F8E 263F0326 E7D1FC7E 8B16E41E C42EF046 89058B02 5F8E263F 0326E7D1
8BF08BF0 4603F246 03058B02 5F8E263F 0326E7D1 FE7E8B16 E01EC42E F2468905
76FF5052 99058B02 5F8E263F 0326E7D1 F87E8B16 EC1EC42E F65689F4 468999C6
2FEB0005 C60A7EC5 087900F6 7E83F656 89F44689 08C48300 14B5089A F476FFF6
087E00FF FE81F08B FAE2D8D1 FAD1000C B9F6568B F4468B00 F6568308 00F44681
025F8E26 3F0326E7 D1FA7E8B 16F81EC4 2E05880A 7EC5C68B 07EBFF05 C60A7EC5
16F01EC4 2EF24689 058B025F 8E263F03 26E7D1FC 7E8B16F4 1EC42EF0 4689058B
2EF65689 F4468999 C68BF08B F04603F2 4603058B 025F8E26 3F0326E7 D1FE7E8B
0014B508 9AF476FF F676FF50 5299058B 025F8E26 3F0326E7 D1F87E8B 16FC1EC4
00F65683 0800F446 812FEB00 05C60E7E C5087900 F67E83F6 5689F446 8908C483
8B07EBFF 05C60E7E C5087E00 FFFE81F0 8BFAE2D8 D1FAD100 0CB9F656 8BF4468B
041EC42E F0468905 8B025F8E 263F0326 E7D1FA7E 8B17081E C42E0588 0E7EC5C6
263F0326 E7D1FE7E 8B17001E C42EF246 89058B02 5F8E263F 0326E7D1 FC7E8B17

F87E8B17 0C1EC42E F65689F4 468999C6 8BF08BF0 4603F246 03058B02 5F8E01FE
89F44689 08C48300 14B5089A F476FFF6 76FF5052 99058B02 5F8E263F 0326E7D1
B9F6568B F4468B00 F6568308 00F44681 2FEB0005 C6127EC5 087900F6 7E83F656
2E058812 7EC5C68B 07EBFF05 C6127EC5 087E00FF FE81F08B FAE2D8D1 FAD1000C
26E7D1FC 7E8B1714 1EC42EF0 4689058B 025F8E26 3F0326E7 D1FA7E8B 17181EC4
4603058B 025F8E26 3F0326E7 D1FE7E8B 17101EC4 2EF24689 058B025F 8E263F03
025F8E26 3F0326E7 D1F87E8B 171C1EC4 2EF65689 F4468999 C68BF08B F04603F2
C5087900 F67E83F6 5689F446 8908C483 0014B508 9AF476FF F676FF50 5299058B
8BFAE2D8 D1FAD100 0CB9F656 8BF4468B 00F65683 0800F446 812FEB00 05C6167E
08C85756 CB5E5FC9 C02B0588 167EC5C6 8B07EBFF 05C6167E C5087E00 FFFE81F0
FA4689E4 2A058A12 7EC5FC46 89E42A05 8A0E7EC5 FE4689E4 2A058A0A 7EC50000
1EC42E35 8B025F8E 263F0326 E7D1FE7E 8B16E01E C42EF846 89E42A05 8A167EC5
5F8E263F 0326E7D1 FA7E8B16 E81EC42E 3503025F 8E263F03 26E7D1FC 7E8B16E4
0005C61A 7EC5087D F60B3503 025F8E26 3F0326E7 D1F87E8B 16EC1EC4 2E350302
C42E0588 1A7EC5C6 8B07EBFF 05C61A7E C5087E00 FFFE81F0 8B02F8C1 C68B1CEB
8E263F03 26E7D1FC 7E8B16F4 1EC42E35 8B025F8E 263F0326 E7D1FE7E 8B16F01E

7E8B16FC 1EC42E35 03025F8E 263F0326 E7D1FA7E 8B16F81E C42E3503 025F01FE
81F08B02 F8C1C68B 1CEB0005 C61F7EC5 087DF60B 3503025F 8E263F03 26E7D1F8
0326E7D1 FE7E8B17 001EC42E 05881E7E C5C68B07 EBFF05C6 1E7EC508 7E00FFFE
8B17081E C42E3503 025F8E26 3F0326E7 D1FC7E8B 17041EC4 2E358B02 5F8E263F
3503025F 8E263F03 26E7D1F8 7E8B170C 1EC42E35 03025F8E 263F0326 E7D1FA7E
EBFF05C6 227EC508 7E00FFFE 81F08B02 F8C1C68B 1CEB0005 C6227EC5 087DF60B
17141EC4 2E358B02 5F8E263F 0326E7D1 FE7E8B17 101EC42E 0588227E C5C68B07
03025F8E 263F0326 E7D1FA7E 8B17181E C42E3503 025F8E26 3F0326E7 D1FC7E8B
1CEB0005 C6267EC5 087DF60B 3503025F 8E263F03 26E7D1F8 7E8B171C 1EC42E35
5FC9C02B 0588267E C5C68B07 EBFF05C6 267EC508 7E00FFFE 81F08B02 F8C1C68B
8A127EC5 FC4689E4 2A058A0E 7EC5FE46 89E42A05 8A0A7EC5 000010C8 5756CB5E
5F8E263F 0326E7D1 FA7E8B16 E81EC42E F84689E4 2A058A16 7EC5FA46 89E42A05
E01EC42E F2468905 8B025F8E 263F0326 E7D1FC7E 8B16E41E C42EF046 89058B02
F65689F4 468999C6 8BF08BF0 4603F246 03058B02 5F8E263F 0326E7D1 FE7E8B16
14B5089A F476FFF6 76FF5052 99058B02 5F8E263F 0326E7D1 F87E8B16 EC1EC42E
F6568308 00F44681 2FEB0005 C61A7EC5 087900F6 7E83F656 89F44689 08C48300

FF05C61A 7EC5087E 00FFFE81 F08BFAE2 D8D1FAD1 000CB9F6 568BF446 8B0001FE
2EF04689 058B025F 8E263F03 26E7D1FA 7E8B16F8 1EC42E05 881A7EC5 C68B07EB
26E7D1FE 7E8B16F0 1EC42EF2 4689058B 025F8E26 3F0326E7 D1FC7E8B 16F41EC4
7E8B16FC 1EC42EF6 5689F446 8999C68B F08BF046 03F24603 058B025F 8E263F03
F4468908 C4830014 B5089AF4 76FFF676 FF505299 058B025F 8E263F03 26E7D1F8
F6568BF4 468B00F6 56830800 F446812F EB0005C6 1E7EC508 7900F67E 83F65689
05881E7E C5C68B07 EBFF05C6 1E7EC508 7E00FFFE 81F08BFA E2D8D1FA D1000CB9
E7D1FC7E 8B17041E C42EF046 89058B02 5F8E263F 0326E7D1 FA7E8B17 081EC42E
03058B02 5F8E263F 0326E7D1 FE7E8B17 001EC42E F2468905 8B025F8E 263F0326
5F8E263F 0326E7D1 F87E8B17 0C1EC42E F65689F4 468999C6 8BF08BF0 4603F246
087900F6 7E83F656 89F44689 08C48300 14B5089A F476FFF6 76FF5052 99058B02
FAE2D8D1 FAD1000C B9F6568B F4468B00 F6568308 00F44681 2FEB0005 C6227EC5
D1FA7E8B 17181EC4 2E058822 7EC5C68B 07EBFF05 C6227EC5 087E00FF FE81F08B
058B025F 8E263F03 26E7D1FC 7E8B1714 1EC42EF0 4689058B 025F8E26 3F0326E7
C68BF08B F04603F2 4603058B 025F8E26 3F0326E7 D1FE7E8B 17101EC4 2EF24689
F676FF50 5299058B 025F8E26 3F0326E7 D1F87E8B 171C1EC4 2EF65689 F4468999
```

EB0005C6 267EC508 7900F67E 83F65689 F4468908 C4830014 B5089AF4 76FF01FE
7E00FFFE 81F08BFA E2D8D1FA D1000CB9 F6568BF4 468B00F6 56830800 F446812F
7D000A7E 83EC8B55 5756CB5E 5FC9C02B 0588267E C5C68B07 EBFF05C6 267EC508
02F8C10A 468B03EB C02B047D 000A7E83 127D00FF 3D02F8C1 0A468B03 EBC02B04
8BC02B06 79D20B99 C78BF88B 0A6EF70C 468BEC8B 555756CB 5E5FC900 FFB803EB
087C00F9 83CA8BD8 8BFAE2D8 D1FAD100 0CB999C7 8BF88B0A 6EF70C46 8B0BFBD0
0C468B0B EBD08BC0 2B0679D2 0B99C78B F88B0A6E F70C468B 2B7300FF FB81317F
C9EC8B55 5756CB5E 5FC900FF B803EBFA E2D8D1FA D1000CB9 99C78BF8 8B0A6EF7
001C11C2 001C11BE 001C11BA 001C11B6 001C11B2 001C11AE 001C11AA 00CB5E5F
001C11E2 001C11DE 001C11DA 001C11D6 001C11D2 001C11CE 001C11CA 001C11C6
001C1154 001C114E 001C1182 001C11EC 000203FC 001C11EA 001C1148 001C11E6
00000000 001C1180 001C117F 001C1179 001C1173 001C116D 001C1167 001C1161
9A35FF02 75FF2B92 3EC52E2B 9636FF2E 2B9836FF 2EEC8B55 57560010 3FE00000
C85756CB 5E5FC904 C4830014 B90B9A35 FF0275FF 2B923EC5 2E08C483 001481B8
36FF2E2B A036FF2E 0A76FF0C 76FF6474 003D832B 9A3EC52E 0000EA46 C7000016
C4830014 D7789A50 EC468D16 50EA468D 160CC483 001481D4 9A50EC46 8D162B9E

2BA23EC5 2E0B6A05 6A35FF2B A63EC52E 35FF2BAA 3EC52E50 EC468D16 500401FE
FF2E0A76 FF0C76FF 34EB16C4 830014D0 BE9A35FF 3DC52BA2 3EC52E02 75FF3DC5
FF2B923E C52E0CC4 83001481 B89A35FF 0275FF2B 923EC52E 2BAE36FF 2E2BB036
2BB236FF 2E2BB436 FF2E0000 0CC85756 CB5E5FC9 04C48300 14B90B9A 35FF0275
5E5F0014 98A69A50 F4468D16 50F6468D 16575608 C4830014 D4149A50 F6468D16
2BBA068B 2E2BBC36 FF2E2BBE 36FF2E2B C036FF2E 2075FFFF 3D05892B B63EC52E
869A50F4 468D1600 6A036A35 FF2BB63E C52E5756 08C48300 1481B89A 50002405
9A50F446 8D16126A 2BC236FF 2E2BC436 FF2E35FF 2BB63EC5 2E57565E 5F001498
830014B6 A89A2BC6 36FF2E2B C836FF2E 2BCA36FF 2E2BCC36 FF2E5E5F 00149866
2E2BBC36 FF2E2BCE 36FF2E2B D036FF2E 2075C20B 02558905 892B923E C52E08C4
5E5F0014 9A0C9A50 F4468D16 006A5756 08C48300 1481B89A 50002405 2BBA068B
BA068B2E 2BBC36FF 2E2BD636 FF2E2BD8 36FF2E20 7400F47E 8305892B D23EC52E
35FF2BB6 3EC52E57 56000002 C85756CB 5E5FC908 C4830014 81B89A50 0024052B
5F001498 E69A50FE 468D1635 FF2BB63E C52E5756 5E5F0014 98C69A50 FE468D16
000004C8 5756CB5E 5FC95E5F 001499EC 9A50FE46 8D1635FF 2BD23EC5 2E57565E
FF2BD23E C52E016A 50FF468D 1635FF2B B63EC52E 57562D75 003D832B DA3EC52E

2BB63EC5 2E57563D EBC02B04 7400FC7E 835E5F00 149C6C9A 50FC468D 163501FE
C52E0B74 00FC7E83 5E5F0014 9C8C9A50 FC468D16 0A76FF35 FF2BD23E C52E35FF
000002C8 5756CB5E 5FC998FF 468A0000 05C72BDA 3EC52ECC EB000105 C72BDA3E
2B047500 FF7E80E7 751BFF7E 800674C0 0B98FF46 8802C483 001419B4 9A0A76FF
00FF7E80 E7754FFF 7E800674 C00B98FF 468802C4 83001419 B49A0A76 FF3EEBC0
04B803EB 0001B8C6 EB077400 533D0774 00503D02 C4830014 19B49A0A 76FFDD74
3EC52E02 02E90375 003D832B 9A3EC52E 0000FE46 C7000002 C85756CB 5E5FC900
046A50FE 468D1604 C4830014 17999A35 FF2BDE3E C52E50E4 2A058A0A 7E032BE2
A23EC52E 0B6A056A 35FF2BA6 3EC52E35 FF2BAA3E C52E2BE6 36FF2E2B E836FF2E
FF0E76FF 50FE468D 1616C483 0014D0BE 9A35FF3D C52BA23E C52E0275 FF3DC52B
6A35FF2B A63EC52E 35FF2BAA 3EC52E0C 76FF0E76 FF5004C4 830014D7 789A0C76
8D1616C4 830014D0 BE9A35FF 3DC52BA2 3EC52E02 75FF3DC5 2BA23EC5 2E0B6A05
6A056A35 FF2BA63E C52E35FF 2BAA3EC5 2E2BEA36 FF2E2BEC 36FF2E04 6A50FE46
FF0E76FF 16C48300 14D0BE9A 35FF3DC5 2BA23EC5 2E0275FF 3DC52BA2 3EC52E0B
E42A058A 0A7E032B E23EC52E 05880A7E 032BEE3E C52E04C4 830014D7 789A0C76
FF2E2BF4 36FF2E04 6A50FE46 8D1604C4 83001417 999A5040 058B2BDE 3EC52E50

75FF3DC5 2BA23EC5 2E0B6A05 6A35FF2B A63EC52E 35FF2BAA 3EC52E2B F23601FE
FF50FE46 8D162075 10460B12 468B16C4 830014D0 BE9A35FF 3DC52BA2 3EC52E02
FF50FE46 8D161AEB 2BF636FF 2E2BF836 FF2E5004 C4830014 D7789A0C 76FF0E76
2BA63EC5 2E35FF2B AA3EC52E 1076FF12 76FF5004 C4830014 D7789A10 76FF1276
C4830014 D0BE9A35 FF3DC52B A23EC52E 0275FF3D C52BA23E C52E0B6A 056A35FF
35FF2BA6 3EC52E35 FF2BAA3E C52E2BFA 36FF2E2B FC36FF2E 046A50FE 468D1616
EB16C483 0014D0BE 9A35FF3D C52BA23E C52E0275 FF3DC52B A23EC52E 0B6A056A
1E9A35FF 0275FF2B 923EC52E 0A76FF0C 76FF0E76 FF2BFE36 FF2E2C00 36FF2E25
C7000088 46C70000 8A46C700 009446C7 00007AC8 5756CB5E 5FC90EC4 830014BB
50FF468D 16509446 8D160198 E9037500 3D832B9A 3EC52E00 14D4B49A 00008646
35FF3DC5 2BA23EC5 2E0275FF 3DC52BA2 3EC52E68 6A046A35 FF2BA63E C52E196A
468D1688 46898646 8B8A4689 88468B00 81E90374 00FF7E80 14C48300 14D0BE9A
C52E0275 FF3DC52B A23EC52E 696A046A 35FF2BA6 3EC52E05 6A508646 8D165094
68E90374 1B8A7E83 FF71E903 744F887E 8314C483 0014D0BE 9A35FF3D C52BA23E
45C73DC5 2C023EC5 2E0291E9 0001B8FF 58E90974 00513D08 7400503D 86468BFF
5600E4E9 037400FF 3DE42AFF 468A0276 E90004B8 000005C7 2C063EC5 2E000308

9246895E 5F00149B 8C9A5094 468D1650 90468D16 006A35FF 2C0A3EC5 2E5701FE
830014D7 E69A9276 FF0231E9 0014D506 9A087400 947E83FF 02E90375 01947E83
C50014D5 069AFED1 E9037400 013D0874 00033D05 8B8C7EC5 8E56898C 468902C4
8B8C7EC5 00142634 9A000005 C72C063E C52E0845 893DC52C 023EC52E 058B8C7E
00947E83 5E5F0014 9B0C9A50 94468D16 016A9076 FF575601 C3E90374 00013D05
8D16006A 57565E5F 001499EC 9A509446 8D1635FF 2C0A3EC5 2E575601 C3E90374
C00B98FE 468802C4 8300141A 329A196A 019AE900 05B85E5F 00149A4C 9A509446
0168E903 7407FF7E 80013FE9 0375003D 832B9A3E C52E0014 D5069AFF 1CE90375
75FF3DC5 2BA23EC5 2E696A04 6A35FF2B A63EC52E 706A5096 468D1650 94468D16
0E36FF2E 2C1036FF 2E509446 8D1614C4 830014D0 BE9A35FF 3DC52BA2 3EC52E02
9A35FF3D C52BA23E C52E0275 FF3DC52B A23EC52E 516A036A 35FF2BA6 3EC52E2C
6A036A35 FF2BA63E C52E2C0E 36FF2E2C 1036FF2E 5094468D 1612C483 0014D0BE
059A468B 12C48300 14D0BE9A 35FF3DC5 2BA23EC5 2E0275FF 3DC52BA2 3EC52E50
C52EFC46 89402C14 36F72ED2 2BFDAB05 9C468BFA 4689402C 1236F72E D22BFFEA
77FA463B E42A0145 8A2BE23E C52E0096 E90374FC 463B4005 8B0B7405 3B2BDE3E
2EFDD4E9 0372FA46 3BFFFF05 C603E42A 01458A2B EE3EC52E F08BE42A 01458A1E

8BE42A04 458A5077 FA463BE4 2A04458A 2BE23EC5 2E5F7400 3D832C16 3EC501FE
94E90375 01FE7E80 FDA3E935 72FA463B FFFF05C6 03E42A04 458A2BEE 3EC52EF0
5F00149B 0C9A5094 468D1601 6A9076FF 5756FD8D E9217400 3D832C16 3EC52EFD
999A096A 146A0014 17629AEC 8B555756 CB5E5FC9 C02BFE62 E9037500 947E835E
83001481 B89A35FF 0275FF2B 923EC52E 2C1A36FF 2E2C1C36 FF2E04C4 83001417
2C1E36FF 2E2C2036 FF2E0A6A 04C48300 14B90B9A 35FF0275 FF2B923E C52E08C4
14B90B9A 35FF0275 FF2B923E C52E0AC4 83001481 B89A35FF 0275FF2B 923EC52E
08C48300 1481B89A 35FF0275 FF2B923E C52E2C22 36FF2E2C 2436FF2E 04C48300
C52E2C26 36FF2E2C 2836FF2E 0C6A04C4 830014B9 0B9A35FF 0275FF2B 923EC52E
830014B9 0B9A35FF 0275FF2B 923EC52E 0AC48300 1481B89A 35FF0275 FF2B923E
0AC48300 1481B89A 35FF0275 FF2B923E C52E2C2A 36FF2E2C 2C36FF2E 0D6A04C4
923EC52E 2C2E36FF 2E2C3036 FF2E04C4 830014B9 0B9A35FF 0275FF2B 923EC52E
04C48300 14B90B9A 35FF0275 FF2B923E C52E08C4 83001481 B89A35FF 0275FF2B
923EC52E 08C48300 1481B89A 35FF0275 FF2B923E C52E2C32 36FF2E2C 3436FF2E
0275FF2B 923EC52E 2C3636FF 2E2C3836 FF2E04C4 830014B9 0B9A35FF 0275FF2B
166A026A 04C48300 14B90B9A 35FF0275 FF2B923E C52E08C4 83001481 B89A35FF

46C70000 D246C700 00D446C7 000042C8 5756CB5E 5FC904C4 83001417 999A01FE
8D16006A 57560401 E9037500 3D832B9A 3EC52E00 00BE46C7 0001CE46 C70000D0
3A36FF2E 2C3C36FF 2E2C3E36 FF2E2C40 36FF2EC0 46895E5F 00149B6C 9A50BE46
D04B9A2C 4236FF2E 2C4436FF 2E2C4636 FF2E2C48 36FF2E08 C4830014 D04B9A2C
FF2E50BE 468D1602 55890589 2BA23EC5 2E2C4416 8B2E2C42 068B2E08 C4830014
D0BE9A35 FF3DC52B A23EC52E 0275FF3D C5006A03 6AC076FF 2BA636FF 2E2BA836
2BDE3EC5 2E00CDF5 46C700FA F146C703 8FE90001 B8067400 BE7E8312 C4830014
04F046C6 04FE46C6 00FD46C6 00FC46C6 01FB46C6 02FA46C6 06F946C6 000505C7
FF2BA63E C52ED076 FFCE76FF 50EE468D 1650BE46 8D160014 F746C700 02F346C7
16C48300 14D0BE9A 35FF3DC5 2BA23EC5 2E0275FF 3DC52BA2 3EC52E02 6A056A35
F546C700 02F346C7 04F046C6 04FE46C6 05892C4A 3EC52EEE 468B8575 00BE7E83
056A35FF 2BA63EC5 2ED076FF CE76FF50 EE468D16 50BE468D 160014F7 46C700BA
BE7E8316 C4830014 D0BE9A35 FF3DC52B A23EC52E 0275FF3D C52BA23E C52E026A
BE468D16 02D846C6 00D746C6 01D646C6 05892C4E 3EC52EEE 468BFF25 E9037400
2EA23EC5 2E0275FF 3DC52BA2 3EC52E52 6A036A35 FF2BA63E C52E50D6 468D1650
C60062F7 46C700CD F546C7FE D6E90374 00BE7E83 12C48300 14D0BE9A 35FF3DC5

C52ED076 FFCE76FF 50EE468D 1650BE46 8D16000A F346C703 F046C601 FE4601FE
14D0BE9A 35FF3DC5 2BA23EC5 2E0275FF 3DC52BA2 3EC52E02 6A056A35 FF2BA63E
8D160589 2C0E3EC5 2E05892B AA3EC52E EE468BFE 80E90374 00BE7E83 16C48300
C52E0275 FF3DC52B A23EC52E 506A036A 35FF2BA6 3EC52E57 2C1036FF 2E50BE46
8D1650BE 468D1602 42C446C7 0016C246 C712C483 0014D0BE 9A35FF3D C52BA23E
2BA23EC5 2E066A06 6A35FF2B A63EC52E 35FF2C4A 3EC52ED4 76FFD276 FF50C246
C7FDEEE9 037400BE 7E8318C4 830014D0 BE9A35FF 3DC52BA2 3EC52E02 75FF3DC5
2BA63EC5 2E35FF2B AA3EC52E D476FFD2 76FF50C2 468D1650 BE468D16 0255C446
C4830014 D0BE9A35 FF3DC52B A23EC52E 0275FF3D C52BA23E C52E066A 066A35FF
76FF50C2 468D1650 BE468D16 0271C446 C7001FC2 46C7FDA3 E9037400 BE7E8318
0275FF3D C52BA23E C52E066A 066A35FF 2BA63EC5 2E35FF2C 4E3EC52E D476FFD2
6A50BE46 8D16FD53 E9037400 BE7E8318 C4830014 D0BE9A35 FF3DC52B A23EC52E
3EC52E0B 6A056A35 FF2BA63E C52E35FF 2C4E3EC5 2E2C5236 FF2E2C54 36FF2E06
2E046A50 BE468D16 16C48300 14D0BE9A 35FF3DC5 2BA23EC5 2E0275FF 3DC52BA2
2BA23EC5 2E0B6A05 6A35FF2B A63EC52E 35FF2C4E 3EC52E2C 5636FF2E 2C5836FF
36FF2E05 6A50BE46 8D1616C4 830014D0 BE9A35FF 3DC52BA2 3EC52E02 75FF3DC5

2BA23EC5 2E0B6A05 6A35FF2B A63EC52E 35FF2BAA 3EC52E2C 5A36FF2E 2C5C01FE
9AFC90E9 287400BE 7E8316C4 830014D0 BE9A35FF 3DC52BA2 3EC52E02 75FF3DC5
9A04C483 0014BB97 9A35FF02 75FF2B92 3EC52E00 0005C72B DA3EC52E 0014184A
00BDE903 75003D83 2B9A3EC5 2E0000FE 46C70000 02C85756 CB5E5FC9 00142042
75FF3DC5 2BA23EC5 2E076A02 6A35FF2B A63EC52E 35FF2C4A 3EC52E50 FE468D16
C52E35FF 2C4E3EC5 2E50FE46 8D1610C4 830014D0 BE9A35FF 3DC52BA2 3EC52E02
14D0BE9A 35FF3DC5 2BA23EC5 2E0275FF 3DC52BA2 3EC52E07 6A026A35 FF2BA63E
C52E0275 FF3DC52B A23EC52E 016A016A 35FF2BA6 3EC52E50 FE468D16 10C48300
D01E9A35 FF2C423E C52E35FF 2C463EC5 2E0EC483 0014D0BE 9A35FF3D C52BA23E
196B9A05 EB04C483 0014D01E 9A35FF2C 3A3EC52E 35FF2C3E 3EC52E04 C4830014
5FC95E5F 00149B0C 9A50FE46 8D16016A 35FF5756 1274003D 832C5E3E C52E0014
003D832B 9A3EC52E 05892C16 3EC52E0A 468B0000 FF6086C7 0000A0C8 5756CB5E
2E2C6636 FF2E2C68 36FF2E00 1421DE9A 04C48300 14977B9A 50FF6086 8D160E75
36FF2E1E 74003D83 2C163EC5 2E0AC483 00141A9D 9A016A2C 6236FF2E 2C6436FF
001493B7 9A0AC483 00141A9D 9A046A2C 6A36FF2E 2C6C36FF 2E2C6E36 FF2E2C70
868D1600 6A2C7236 FF2E2C74 36FF2E00 6A575600 14D4B49A 00008C46 C78E4689

2C7836FF 2E8C76FF 57565675 01FF60BE 83904689 5E5F0014 9BCC9A50 FF6001FE
9A502E75 00FF60BE 83924689 5E5F0014 9BCC9A50 FF60868D 16006A2C 7636FF2E
C50DEB00 01FF6086 C708758E 463B058B 987EC59A 56899846 8902C483 0014D7E6
E69A9076 FF017BE9 037400FF 60BE8300 14D5069A 87EB5057 568C4689 058B987E
468D1650 00100552 0099E903 7500107D 80947EC5 96568994 468902C4 830014D7
9A509C46 8D1650FF 60868D16 4874003D 832B9A3E C52E08C4 830014D7 469A509C
2E0B6A05 6A35FF2B A63EC52E 35FF2C4A 3EC52E50 9C468D16 5004C483 0014D778
0A6A156A 35EB16C4 830014D0 BE9A35FF 3DC52BA2 3EC52E02 75FF3DC5 2BA23EC5
2E08C483 001481B8 9A35FF02 75FF2B92 3EC52E50 9C468D16 04C48300 1417999A
579676FF 00BAE903 75003D80 947EC504 C4830014 B90B9A35 FF0275FF 2B923EC5
74003D83 2B9A3EC5 2E0CC483 001481D4 9A509C46 8D162C7A 36FF2E2C 7C36FF2E
04C48300 14D7789A 509C468D 1650FF60 868D1604 C4830014 17999A01 6A016A54
FF3DC52B A23EC52E 0B6A056A 35FF2BA6 3EC52E35 FF2BAA3E C52E509C 468D1650
C4830014 17999A0C 6A156A41 EB16C483 0014D0BE 9A35FF3D C52BA23E C52E0275
0275FF2B 923EC52E 08C48300 1481B89A 35FF0275 FF2B923E C52E509C 468D1604
62868905 8B2C063E C52E04C4 83001417 999A166A 026A04C4 830014B9 0B9A35FF

9A0014B3 B39A2C7E 0EDC2E9B 0474DA26 9B05DB9B 3DC535C4 2C023EC5 2EFF01FE
2C063EC5 2E0081E9 0375003D 832B9A3E C52E0589 2C063EC5 2E08C483 0014B413
868D1657 5600DEE9 0375053B FF62868B 2C063EC5 2E001305 C7047C00 143D058B
50FF6286 2B058B2C 063EC52E 50FF6086 CD165E5F 00340002 9A196A20 6A50FF64
2E0B6A05 6A35FF2B A63EC52E 35FF2C4E 3EC52E50 52009C2D FF628603 5A16C58B
8D165756 7DEB16C4 830014D0 BE9A35FF 3DC52BA2 3EC52E02 75FF3DC5 2BA23EC5
3C03261F 16FD8B2C 0636C42E 5E5F0034 00029A35 FF2C063E C52E206A 50FF6486
9A35FF02 75FF2C86 3EC52E2C 8A36FF2E 2C8C36FF 2E50FF64 868D1600 FF6485C6
75FF2B92 3EC52E04 C4830014 B90B9A35 FF0275FF 2C863EC5 2E0CC483 001481B8
5756CB5E 5FC99B04 C4830014 97DC9A50 FF60868D 1604C483 0014B972 9A35FF02
FE7E83E7 7505FE7E 83067404 FE7E830C 7400013D FE468900 141CE09A 000004C8
00010A45 C73DC52C 023EC52E 00142634 9A000008 45C73DC5 2C8E3EC5 2E577501
36FF2E00 6A006A00 6A006A00 6A006A5E 5F00149C 0C9A50FC 468D1605 00685756
057504FE 7E8302C4 830014D8 029A1717 6810C483 00149077 9A2C9236 FF2E2C94
0A74001C 0A4E001C 073D001C 1290001C 0738001C 0A3E00CB 5E5FC900 1426349A
0785001C 0772001C 0756001C 0EDE001C 09E0001C 074F001C 0746001C 0A44001C

001C09F8 001C0A46 001C0A72 001C07AB 001C0A70 001C078E 001C078C 001C01FE
001C1288 001C07E7 001C07E2 001C07D9 001C07D4 001C09FE 001C07CF 001C07CA
001C0844 001C0812 001C07E8 001C0A48 000E0009 001C0A52 001C128C 001C1292
001C0A4A 001C0A78 001C0A76 001C0949 001C0916 001C08DA 001C08A8 001C0876
001C0990 001C128E 001C098A 001C0985 001C097E 001C0A7A 001C0A42 001C0A4C
40340000 00000000 001C09B4 001C09EC 001C09E2 001C09AB 001C09A2 001C0999
1476FF00 0005C712 7EC50001 02C85756 001C09D0 001C1284 001C09BD 001C1294
12868B53 75003D83 127EC50C C4830014 2EC39A0A 76FF0C76 FF50FEFE 868D1657
359A0A76 FF0C76FF 50529900 6AFE4689 FF0A868B 02558905 893CAE3E C52E99FF
0E76FF10 76FF016A 0100680A 76FF0C76 FF2175C0 0B058912 7EC50AC4 830014C0
0005C712 7EC50001 02C85756 CB5E5FC9 003D8305 89127EC5 0CC48300 14BE989A
75003D83 127EC50C C4830014 2EC39A0A 76FF0C76 FF50FEFE 868D1657 1476FF00
FF0C76FF 50529900 6AFE4689 FF0A868B 02558905 893CAE3E C52E99FF 12868B53
76FF016A 0100680A 76FF0C76 FF2175C0 0B058912 7EC50AC4 830014C0 359A0A76
7EC50001 02C85756 CB5E5FC9 003D8305 89127EC5 0CC48300 14BF669A 0E76FF10
FF50FEFE 868D1612 76FF1476 FF04C483 00142E32 9A50FEFE 868D1600 0005C712

AE3EC52E 99FF1286 8B537500 3D83127E C50CC483 00142E78 9A0A76FF 0C7601FE
0AC48300 14C0359A 0A76FF0C 76FF5052 99006AFE 4689FF0A 868B0255 8905893C
830014BF 669A0E76 FF1076FF 016A0100 680A76FF 0C76FF21 75C00B05 89127EC5
C7000102 45C70100 05C70A7E C5EC8B55 5756CB5E 5FC9003D 83058912 7EC50CC4
00050E45 89010005 0C458905 8B00000A 45C70000 0845C702 000645C7 00050445
000005C7 127EC5EC 8B555756 CB5E5FC9 14458902 00051245 89010005 10458901
0C76FF1E 75C00B05 89127EC5 0AC48300 14C0359A 0A76FF0C 76FF006A 006A006A
56CB5E5F C9058912 7EC50CC4 830014BF 669A0E76 FF1076FF 016A0100 680A76FF
C50AC483 0014C035 9A0A76FF 0C76FF00 6A006A00 6A000005 C7127EC5 EC8B5557
C4830014 BE989A0E 76FF1076 FF016A01 00680A76 FF0C76FF 1E75C00B 0589127E
2E3CB436 FF2E50FE 468D1600 00FE46C7 000010C8 5756CB5E 5FC90589 127EC50C
3CB23EC5 2E043DE9 037400FE 7E830CC4 8300142C 969A0A76 FF0C76FF 3CB236FF
FC7E8300 00FC46C7 000005C7 3CB63EC5 2E0429E9 FFFFFE46 C708740E 463B058B
3CBE3E03 2EE7D1FC 7E8B009C E903750E 4623E0D3 FC4E8B00 01B800B2 E9037C04
B63EC52E 05893CBC 1E8E2E3C BA3E032E E7D13D8B 3CB63EC5 2E058B3C C01E8E2E
8E2E3CC6 3E032EE7 D1FC7E8B 9374003D 833CBC1E 8E2E3CBA 3E032EE7 D13D8B3C

B63EC52E 05893CC4 1E8E2E3C C23E032E E7D13D8B 3CB63EC5 2E058B3C C81E01FE
D13D8B48 E0D3CE8B 0001B837 2B260008 BE3CC406 8E2E3CC2 1E032EE3 D11D8B3C
C73CCE3E C52EFF45 E9FC46FF 05FF3CB6 3EC52E05 893CCC1E 8E2E3CCA 3E032EE7
3CCE3EC5 2E077410 4623E0D3 FC4E8B00 C1B8197D 04FC7E83 0000FC46 C7000005
C6033CDA 3EF72E99 058BF28B 3CDA3EF7 2E99058B 3CD63EC5 2EE1EBFC 46FF05FF
FA468905 893CDC3E C52E2CF7 26058B3C CE3EC52E 3CD236C4 2E05893C D23EC52E
F25689F0 4689D22B 058B3CE0 3EC52E5A 7D053BFC 468B3CB6 3EC52E00 00FC46C7
0014B51E 9A505299 058B3CBC 1E8E2E3C BA3E032E E7D1FC7E 8B5052D2 2BFA468B
468B3CBC 1E8E2E3C BA3E032E E7D1FC7E 8B1C77F0 463B0572 2377F256 3B08C483
2E05893C E83EC52E FC468B05 893CE43E C52EFA46 8B9AEBFC 46FFFA46 8925F7FA
768B207D 053BFC46 8B3CB63E C52EFC46 89058B3C E83EC52E 000105C7 3CEC3EC5
C52ED4EB FC46FF05 892CF726 058B3CEC 3EC52E3C BC068E2E 3CBA3603 2EE6D1FC
00F846C7 02558905 893CF03E C52E02C4 830014D3 6C9A5002 E0C14005 8B3CEC3E
F036C42E 02C48300 14D36C9A 35FF3CE4 3EC52E37 7D053BF8 468B3CEC 3EC52E00
FF01DBE9 220CFE46 C70875C2 0B025589 0589025C 8E263C03 2602E7C1 F87E8B3C
166C7D05 3BF8468B 3CEC3EC5 2E0000F8 46C70000 F646C700 00F446C7 BDEBF846

C1F87E8B 3CF036C4 2E35FF3C F43EC52E 1076FF35 FF3CE43E C52E50FE 468D01FE
83001433 839A0A76 FF0C76FF F476FFF6 76FF35FF 0275FF02 5C8E263C 032602E7
C78BF88B 37F726D2 2B048B3C E436C52E 3CDC1EC4 2E0171E9 037400FE 7E8316C4
55890589 3CF83EC5 2E02C483 0014D36C 9A766A88 EBF846FF F65611F4 4601D22B
3DC53CF8 3EC52E05 8B3CB63E C52E0255 89058912 7EC5058B FF51E903 75C20B02
C53CF83E C52E058B 3CFC3EC5 2E024589 3DC53CF8 3EC52E05 8B3CCE3E C52E0589
F83EC52E 058B3CDC 3EC52E06 45893DC5 3CF83EC5 2E058B3C D23EC52E 0445893D
C52E058B 3CE43EC5 2E0A4589 3DC53CF8 3EC52E05 8B3CE03E C52E0845 893DC53C
058B3CEC 3EC52E0E 45893DC5 3CF83EC5 2E058B3C E83EC52E 0C45893D C53CF83E
55891245 893DC53C F83EC52E 02558B05 8B3CF03E C52E1045 893DC53C F83EC52E
BC1E8E2E 3CBA3E03 2EE7D1FC 7E8B6A7D 053BFC46 8B3CB63E C52E0000 FC46C714
C23E032E E7D1FC7E 8B164589 025C8E26 3C0326E7 D1FC7E8B 3CF836C4 2E058B3C
CA3E032E E7D1FC7E 8B364589 025C8E26 3C0326E7 D1FC7E8B 058B3CC4 1E8E2E3C
C9FE468B 8AEBFC46 FF564589 025C8E26 3C0326E7 D1FC7E8B 058B3CCC 1E8E2E3C
8B058B3C AE3EC52E 72751846 3B16468B 000005C7 1C7EC500 005CC857 56CB5E5F
0308C483 0014B514 9A505299 058B3CDC 3EC52E50 0E468D16 A65689A4 46890255

C50AC483 0014C035 9A0A76FF 0C76FF50 52006AFE 5689FC46 89A65613 A44601FE
14BE989A 1276FF14 76FF016A 1A76FF0A 76FF0C76 FF019BE9 0374C00B 05891C7E
C52EFA46 892CF726 058B3D00 3EC52E3C D236C42E 017AE905 891C7EC5 0CC48300
C20BF656 89F44689 02C48300 14D36C9A 1A76FFF8 468935F7 D22B1A46 8B3CDC3E
164623E0 D3F04E8B 0001B850 7D04F07E 830000F0 46C70000 F246C701 41E90375
0D741846 23E0D3F0 4E8B0001 B82D7D05 3BEE468B 3CD23EC5 2E0000EE 46C73E74
C7EBEE46 FFF246FF 00AE45C6 F27E031F 16FD8B0B EB01AE45 C6F27E03 1F16FD8B
505299FA 468B500E 468D16A6 5689A446 8902558B 058B3CAE 3EC52EAA EBF046FF
359A0A76 FF0C76FF 5052006A FE5689FC 4689A656 13A44603 08C48300 14B5149A
E9037CF8 463BAC46 8B0000AC 46C70094 E90374C0 0B05891C 7EC50AC4 830014C0
468B08EB AC462BF8 468B0873 C73BAC46 2BF8468B F88BFA76 F7D22B1A 468B0084
76FFF676 FF016A50 0A76FF0C 76FFA846 89AA6EF7 FA468BAA 4689FA76 F7D22B1A
F676FFAA 76FF50AE 468D16F2 76FF3475 C00B0589 1C7EC50C C4830014 BE989AF4
AA468B10 C4830014 35889A50 5214568B 124603AC 6EF7058B 3CDC3EC5 2EF476FF
8B0000FE 46C70000 F846C700 00FA46C7 000008C8 5756CB5E 5FC9FF71 E9AC4601
003D8016 5E8E147E 03FC7E8B 357D1846 3BFC468B 0000FC46 C7477D12 463BFE46

880C5E8E 0A7E03F8 46FFF87E 8B98058A 105E8E0E 7E03FA46 FFFA7E8B 1F7401FE
2E0000FE 46C70000 02C85756 CB5E5FC9 B1EBFE46 FFC3EBFC 46FFFA46 FF03EB05
0275FF02 5C8E263C 032602E7 C1FE7E8B 3CF036C4 2E247D05 3BFE468B 3CEC3EC5
C4830014 D3F99A35 FF0275FF 3CF03EC5 2ED0EBFE 46FF04C4 830014D3 F99A35FF
127EC500 000AC857 56CB5E5F C904C483 0014D3F9 9A35FF02 75FF3CF8 3EC52E04
0CC48300 142C969A 0A76FF0C 76FF3CB2 36FF2E3C B436FF2E 571476FF 000005C7
E9037C04 FE7E8300 00FE46C7 000005C7 3CB63EC5 2E020FE9 0374003D 83127EC5
1E8E2E3C BE3E032E E7D1FE7E 8B757405 23E0D3FE 4E8B0001 B83CB23E C52E008C
3D8B3CB6 3EC52E05 893CBC1E 8E2E3CBA 3E032EE7 D13D8B3C B63EC52E 058B3CC0
E7D1FE7E 8B019FE9 FFFF05C7 127EC50A 75003D83 3CBC1E8E 2E3CBA3E 032EE7D1
893CC41E 8E2E3CC2 3E032EE7 D13D8B3C B63EC52E 058B3CC8 1E8E2E3C C63E032E
D63EC52E 05893CCE 3EC52E05 8B3D003E C52EFF6B E9FE46FF 05FF3CB6 3EC52E05
D236C42E 05893CD2 3EC52EC6 033CDA3E F72E9905 8BF28B3C DA3EF72E 99058B3C
8B3CB63E C52E0000 FE46C7FC 46890589 3CDC3EC5 2E2CF726 058B3CCE 3EC52E3C
D1FE7E8B 5052D22B FC468BF8 5689F646 89D22B05 8B3CE03E C52E5A7D 053BFE46
3B057223 77F8563B 08C48300 14B51E9A 50529905 8B3CBC1E 8E2E3CBA 3E032EE7

FE46FFFC 468925F7 FC468B3C BC1E8E2E 3CBA3E03 2EE7D1FE 7E8B1C77 F64601FE
2E000105 C73CEC3E C52E0589 3CE83EC5 2EFE468B 05893CE4 3EC52EFC 468B9AEB
2E3CBA36 032EE6D1 FE768B20 7D053BFE 468B3CB6 3EC52EFE 4689058B 3CE83EC5
02E0C140 058B3CEC 3EC52ED4 EBFE46FF 05892CF7 26058B3C EC3EC52E 3CBC068E
FA468B3C EC3EC52E 0000FA46 C7025589 05893CF0 3EC52E02 C4830014 D36C9A50
032602E7 C1FA7E8B 3CF036C4 2E02C483 0014D36C 9A35FF3C E43EC52E 387D053B
CB5E5FC9 BCEBFA46 FF05EB22 0C05C712 7EC50975 C20B0255 89058902 5C8E263C
468D16FA 5689F846 8902558B 058B3CAE 3EC52E00 0005C718 7EC50000 08C85756
FE5689FC 4689FA56 13F84603 08C48300 14B5149A 50529905 8B3CDC3E C52E500E
76FF0C76 FF1E75C0 0B058918 7EC50AC4 830014C0 359A0A76 FF0C76FF 5052006A
C85756CB 5E5FC905 89187EC5 0CC48300 14BF669A 1276FF14 76FF016A 1676FF0A
76FF627D 053BFE46 8B3CEC3E C52E0000 FE46C700 00FC46C7 0000FA46 C7000006
0275FF02 5C8E263C 032602E7 C1FE7E8B 3CF036C4 2E35FF3C E43EC52E 0E76FF10
C42E6975 003D830E 7EC512C4 83001438 9A9A0A76 FF0C76FF FA76FFFC 76FF35FF
92EBFE46 FFFC5611 FA4601D2 2BC78BF8 8B37F726 D22B048B 3CE436C5 2E3CDC1E
263C0326 02E7C1FE 7E8B3CF0 36C42E24 7D053BFE 468B3CEC 3EC52E00 00FE46C7

FF0275FF 3CF03EC5 2ED0EBFE 46FF04C4 830014D3 F99A35FF 0275FF02 5C8E01FE
48058B3C E83EC52E 0000FC46 C700000E C85756CB 5E5FC904 C4830014 D3F99A35
5E8E0A7E 03F87E8B 3CC4068E 2E3CC236 032EE6D1 F8768B58 7C00F87E 83F84689
4689058B 3CBC1E8E 2E3CBA3E 032EE7D1 F87E8BFA 4689E8D3 0C8B26E4 2A058A0C
EBF84EFF FC4689FA 4603FC66 F7F2468B 00A5E9D0 8BC02B07 7CF2463B FA468BF2
F8768B51 7C053BF8 468B3CE8 3EC52EF8 46894805 8B3CB63E C52E0000 FE46C7A2
4689E8D3 0C8B26E4 2A058A0C 5E8E0A7E 03F87E8B 3CC4068E 2E3CC236 032EE6D1
F2468B8C 7DF2463B FA468BF2 4689058B 3CBC1E8E 2E3CBA3E 032EE7D1 F87E8BFA
C52E0245 8E350302 E6C1FE76 8B3CF03E C52EA3EB F84EFFFE 4689FA46 03FE6EF7
FF000004 C85756CB 5E5FC9F6 5689F446 8902548B 26040326 25F7FC46 8B3CDC3E
3EC52E50 520E76FF 1076FF57 56FE5689 FC468904 C4830014 39E59A0A 76FF0C76
001439E5 9A0A76FF 0C76FF00 0004C857 56CB5E5F C95E5F00 2C00029A 35FF3CDC
5F002C00 029A35FF 3CDC3EC5 2E0E76FF 1076FF50 525756FE 5689FC46 8904C483
7C00F67E 83F64689 48058B3C E83EC52E 0000FC46 C700000E C85756CB 5E5FC95E
3CBC1E8E 2E3CBA3E 032EE7D1 F67E8BFA 4689E42A 058A0C5E 8E0A7E03 F67E8B44
FC4689FA 4603FC66 F7F8468B 0091E9D0 8BC02B07 7CF8463B FA468BF8 4689058B

3BF6468B 3CE83EC5 2EF64689 48058B3C B63EC52E 0000FE46 C7B6EBF6 4EFF01FE
1E8E2E3C BA3E032E E7D1F67E 8BFA4689 E42A058A 0C5E8E0A 7E03F67E 8B3D7C05
B7EBF64E FFFE4689 FA4603FE 6EF7F846 8BA07DF8 463BFA46 8BF84689 058B3CBC
548B2604 032625F7 FC468B3C DC3EC52E C2458E35 0302E6C1 FE768B3C F03EC52E
8904C483 00143B5D 9A0A76FF 0C76FF00 0004C857 56CB5E5F C9F45689 F2468902
5E5FC95E 5F002C00 029A35FF 3CDC3EC5 2E50520E 76FF1076 FF5756FE 5689FC46
FF505257 56FE5689 FC468904 C4830014 3B5D9A0A 76FF0C76 FF000004 C85756CB
001C0A82 001C0A7E 00CB5E5F C95E5F00 2C00029A 35FF3CDC 3EC52E0E 76FF1076
001C0BE6 001C0BE4 001C0BC4 001C0A8E 001C0BA4 001C0AAE 001C0B84 001C0B82
0A84001C 0BF0001C 0BEE001C 0BEC001C 0BEA001C 0A7C001C 0BE80002 001C0A8A
2E49DC06 8B2E0000 FCB486C7 000688C8 5756001C 0A88001C 0A8C001C 0BF4001C
C4830014 D1369A49 E036FF2E 49E236FF 2E01CE68 F97C9689 F97A8689 49DE168B
08C48300 14C0BE9A 50046A00 6A006A0F 7400FCB4 BE83FCB4 86890014 7B3A9A06
066A0AC4 830014B4 EA9A49E4 36FF2E49 E636FF2E 49E036FF 2E49E236 FF2E666A
EA9A49E8 36FF2E49 EA36FF2E 505204C4 8300147B D29A49E4 36FF2E49 E636FF2E
08C48300 14C0BE9A 35FF046A 006A006A 1074003D 8349EC3E C52E0AC4 830014B4

49F0068B 2E49F236 FF2EF97A B6FFF97C B6FF50F9 78868D16 0000F978 86C701FE
FF2E49F6 36FF2E49 F836FF2E 49FA36FF 2E016868 0CC48300 1463489A 50000305
50EE468D 16500054 0549E006 8B2E49E2 36FF2E12 6A0AC483 0014B4EA 9A49F436
7F119A49 E436FF2E 49E636FF 2E50EE46 8D16026A FF6A126A 0AC48300 14B4EA9A
006A006A 006A1374 00EA7E83 0AC48300 14B4EA9A 50DC468D 1650520C C4830014
830014B4 EA9A50CA 468D16DC 76FFDE76 FF126A0A C4830014 C0BE9AEA 76FF046A
6C569A00 6A50FD58 868D1650 F9EA868D 16FD5E96 89FD5C86 895A16CA 468D0AC4
0014C0BE 9AD90468 046A006A 006A006A 137400FC B4BE83FC B486890A C4830014
0014707E 9A50FD58 868D1650 FD12868D 1650FCBE 868D1600 01FD1286 C70AC483
16505208 C4830014 7CB89A49 E836FF2E 49EA36FF 2E50FD30 868D1668 6A0CC483
830014B4 EA9A50B8 468D1650 F9D6868D 16126A0A C4830014 B4EA9A50 F982868D
6A000105 C749FC3E C52E00E2 E9037500 FCB6BE80 FCB68688 E42AFD57 868A0AC4
B6FF5052 006A006A FCBC9689 FCBA8689 04C48300 14D3B79A 50E42AFC B6868A07
458BFCBA BEC514C4 83001471 9B9A50FD 58868D16 50FCB786 8D16F97E B6FFF980
B486890A C4830014 70B79A50 FD58868D 16FCB8B6 FF50FCCE 868D16FC B8868904
868D1650 5208C483 00147CB8 9A49E836 FF2E49EA 36FF2E50 FCEC868D 16686AFC

830014B4 EA9A50A6 468D1650 F9D6868D 16126A0A C4830014 B4EA9A50 F98201FE
146C699A 50FD5886 8D16FCAC 9ED99BFD 0486D99B FCB09ED9 9BFD0086 D99B0AC4
C749FC3E C52E09EB 04C48300 14D3F99A FCBAB6FF FCBCB6FF FCB48689 04C48300
0014D544 9A5B74C0 0B08C483 0014408D 9A50FA16 868D1650 FA0E868D 16000005
1650FA30 868D1650 FA34868D 160AC483 0014C0BE 9A22B268 006A006A 006A006A
001441B8 9A50B846 8D1650A6 468D1650 FCB0868D 1650FCAC 868D1650 FA16868D
00B0C857 56CB5E5F C99B0AC4 830014C0 BE9AD900 68006A00 6A006A00 6A1CC483
C52EFF6C 9ED99B05 D99B4A00 3EC52EFF 609ED99B EED99BFF 649ED99B EED99B00
B4EA9A50 FF76868D 1649E436 FF2E49E6 36FF2E66 6AF7689E D99B05D9 9B4A043E
FF50868D 1600B068 5E5F0034 00029A0F 6A006A50 FF50868D 1657560A C4830014
057500FF 74BE8310 C4830014 90779A4A 0836FF2E 4A0A36FF 2E046A0A 6A046A50
5E5F002C 00029A0F 6A50FF50 868D1650 0003050A 468B0C76 FF575600 9CE9C02B
804A0C3E C52E5E5F 002C0002 9A0F6A50 DC468D16 4A0C36FF 2E4A0E36 FF2E5756
5F002C00 029A0F6A 50EC468D 164A1036 FF2E4A12 36FF2E57 560005C6 0375203D
9B0A7EC5 FF6486D9 9A000005 C74A143E C52E0005 C6037520 3D804A10 3EC52E5E
01B81A5D D99BFF68 86D99B1E 5DD99BFF 6C86D99B 125DD99B FF6086D9 9B165DD9

026A016A 126A0000 FF6286C7 0032FE6C 86C70001 ACC85756 CB5E5FC9 9B0001FE
9A50A846 8D165052 0CC48300 147F119A 49E436FF 2E49E636 FF2E0A76 FF0C76FF
0AC48300 14C0BE9A D9026804 6A006A00 6A006A13 7400B67E 830AC483 0014B4EA
6A5B7400 3D8349FC 3EC52E0A C4830014 B4EA9A50 DE468D16 A876FFAA 76FF126A
1650520C C4830014 7F119A49 E436FF2E 49E636FF 2E0E76FF 1076FF02 6A026A12
C0BE9AD9 0368046A 006A006A 006A1374 00A47E83 0AC48300 14B4EA9A 5096468D
05D99B1E 7EC50AC4 830014B4 EA9A50CC 468D1696 76FF9876 FF126A0A C4830014
50FF6186 8D1650FF 60868D16 50FF6286 8D16F85E D99B05D9 9B227EC5 FC5ED99B
50FC468D 1650F846 8D1650F0 468D1650 F4468D16 50FF6E86 8D1650FF 5C868D16
14B4499A 0014B3B3 9A0DD89B F446D99B 227EC528 C4830014 87629A50 DE468D16
B6FF50FF 62868D16 0000FE70 86C70000 FE6E86C7 FE749689 FE728689 08C48300
1650FE76 868D1650 FF62868D 160CC483 001464BB 9AFE72B6 FF52FE6E B6FFFE70
76FF2076 FF2276FF 2476FF12 76FF1476 FF1676FF 1876FF50 F0468D16 50F4468D
FE688689 FE78868B FE6A8689 E42AFE77 868A24C4 83001456 C09A50CC 468D161E
0002FF7C 86C70001 FF7A86C7 FE648689 48E0D3FE 668E8B00 01B80004 FE6686C7
5486DC9B 0DD89BF0 46D99B1E 7EC5FE54 9EDD9BE8 D99B01FF 7F86C602 FF7E86C6

14B3B39A FE668EDE 9BFE5C8E DC9B0DD8 9BF446D9 9B227EC5 FE5C9EDD 9BFE01FE
36FF2E1A 76FF1C76 FF50FF7A 868D1612 6A825689 80468908 C4830014 B4679A00
7E830AC4 830014B4 EA9A5084 468D1650 520CC483 00147FA1 9A49E436 FF2E49E6
168476FF 8676FF12 6A0AC483 0014C0BE 9AD90168 046A006A 006A006A 13740092
8D1650FE 76868D16 50FF6686 8D1650FF 62868D16 0AC48300 14B4EA9A 50BA468D
C4830014 AACA9A50 BA468D16 1E76FF20 76FF2276 FF2476FF 50F0468D 1650F446
9B227EC5 FF788689 08C48300 14B4139A 0014B3B3 9AF04ED8 9B05D99B 1E7EC520
74003D80 4A0C3EC5 2EFF7686 8908C483 0014B413 9A0014B3 B39AF44E D89B05D9
3EC52E00 020D814A 143EC52E 0974003D 804A103E C52E0001 0D814A14 3EC52E09
6486C747 4B466445 8544EB44 E3A7FF2E D88BE0D1 039FE903 7600033D 058B4A14
B6FFFF6E B6FFFF70 B6FF50FF 62868D16 037BE903 7CFF7686 3BFF6486 8B0000FF
8300145D FC9AFF64 B6FF50FF 6A868D16 50FF6286 8D160AC4 8300148A 089AFF64
FF78B6FF FE66B6FF FF5CB6FF FF5EB6FF FF66B6FF FF68B6FF 50FF6286 8D160AC4
8D1650FF 62868D16 18C48300 1448DC9A FF6EB6FF FF70B6FF FF6AB6FF FF6CB6FF
FFFF78B6 FFFF76B6 FFFF6CE9 FF6486FF 0AC48300 14ABE49A FF64B6FF 50FF6686
50BA468D 1649E436 FF2E49E6 36FF2E4A 0C36FF2E 4A0E36FF 2EFE68B6 FFFE64B6

A7E9037C FF76863B FF64868B 0000FF64 86C7FF62 868914C4 83001400 009A01FE
FF62868D 160AC483 00148A08 9AFF64B6 FFFF6EB6 FFFF70B6 FF50FF62 868D1602
66B6FFFF 68B6FF50 FF62868D 160AC483 00145DFC 9AFF64B6 FF50FF6A 868D1650
6EB6FFFF 70B6FFFF 6AB6FFFF 6CB6FFFF 78B6FFFE 66B6FFFF 5CB6FFFF 5EB6FFFF
1650FF62 868D1604 C4830014 089D9AFF 66B6FFFF 68B6FF18 C4830014 48DC9AFF
FF78B6FF FF76B6FF FF5CE9FF 6486FF0A C4830014 ABE49AFF 64B6FF50 FF66868D
BA468D16 49E436FF 2E49E636 FF2E4A10 36FF2E4A 1236FF2E FE68B6FF FE64B6FF
0097E903 7CFF7686 3BFF6486 8B0000FF 6486C7FF 62868914 C4830014 733E9A50
50FF6286 8D160AC4 8300148A 089AFF64 B6FFFF6E B6FFFF70 B6FF50FF 62868D16
FF66B6FF FF68B6FF 50FF6286 8D160AC4 8300145D FC9AFF64 B6FF50FF 6A868D16
FF6EB6FF FF70B6FF FF6AB6FF FF6CB6FF FF78B6FF FE66B6FF FF5CB6FF FF5EB6FF
8D1650FF 62868D16 04C48300 1479059A FF66B6FF FF68B6FF 18C48300 1448DC9A
FF012EE9 0014763A 9AFF5CE9 FF6486FF 0AC48300 14ABE49A FF64B6FF 50FF6686
FF2E49E6 36FF2E4A 0C36FF2E 4A0E36FF 2EFE68B6 FFFE64B6 FFFF78B6 FFFF76B6
FE64B6FF FF78B6FF FF76B6FF FF628689 14C48300 1400009A 50BA468D 1649E436
733E9A50 BA468D16 49E436FF 2E49E636 FF2E4A10 36FF2E4A 1236FF2E FE68B6FF

8D1600A7 E9037CFF 76863BFF 64868B00 00FF6486 C7FF6286 8914C483 001401FE
8D1650FF 62868D16 0AC48300 148A089A FF64B6FF FF6EB6FF FF70B6FF 50FF6286
B6FFFF66 B6FFFF68 B6FF50FF 62868D16 0AC48300 145DFC9A FF64B6FF 50FF6A86
DC9AFF6E B6FFFF70 B6FFFF6A B6FFFF6C E6FFFF78 B6FFFE66 B6FFFF5C B6FFFF5E
059AFF66 B6FFFF68 B6FF04C4 83001408 9D9AFF66 B6FFFF68 B6FF18C4 83001448
86FF0AC4 830014AB E49AFF64 B6FF50FF 66868D16 50FF6286 8D1604C4 83001479
8D160014 AE7E9A00 1460F79A 00148C69 9A001405 8B9A0014 763A9AFF 4CE9FF64
A8468D16 04C48300 14D3F99A FF6EB6FF FF70B6FF 04C48300 1469809A 50FF6286
04C48300 147FE99A 5096468D 160D7400 3D8349FC 3EC52E04 C4830014 7FE99A50
FE468B00 00FE46C7 000012C8 5756CB5E 5FC99B04 C4830014 7FE99A50 84468D16
89058B4A 1A1E8E2E 4A183E03 2E02E7C1 FE7E8B00 00F646C7 00E6E903 7C14463B
0C5E8E0A 7E03E7D1 F846FFF8 7E8B00B6 E9037C12 463BF646 8B0000F8 46C7F446
067E1246 3BF64689 F64603FC 4689058B 0A7E03E7 D1F846FF F87E8BFA 4689058B
50F2468D 165756F0 5689EE46 89000405 18568B16 460324FA 466BFC46 2912462B
8B57561D 7500FF3D E42AF346 8A5E5F00 2C00029A 026A5052 EE4603E0 D1FE468B
03F4468B 575620EB 00340002 9AFC76FF 50E42AF2 468A5052 1C568B1A 4603F446

468B5E5F 002C0002 9AFC76FF 50521056 8B0E4603 F4468B50 521C568B 1A4601FE
001C0014 001C01E8 001C0000 CB5E5FC9 FF0FE9FE 46FFFF3F E9F44689 F44603FC
001C0096 001C0092 001C03C6 001C024E 001C0080 001C0068 001C007E 001C007A
2E058B0A 7EC50000 06C85756 001C03B6 001C03E8 001C03D8 001C03C8 001C0008
0589566C 3EC52E06 458B0A7E C5058956 683EC52E 02458B0A 7EC50589 56643EC5
0C458B0A 7EC50589 56743EC5 2E0A458B 0A7EC505 8956703E C52E0845 8B0A7EC5
8956803E C52E1045 8B0A7EC5 0589567C 3EC52E0E 458B0A7E C5058956 783EC52E
468B5664 3EC52E00 00FE46C7 02558905 8956843E C52E1455 8B12458B 0A7EC505
1E8E2E56 883E032E E7D1FE7E 8B16458B 0C5E8E0A 7E03E7D1 FE7E8B62 7D053BFE
8E1E8E2E 568C3E03 2EE7D1FE 7E8B3645 8B0C5E8E 0A7E03E7 D1FE7E8B 0589568A
56921E8E 2E56903E 032EE7D1 FE7E8B56 458B0C5E 8E0A7E03 E7D1FE7E 8B058956
C52E0589 56983EC5 2E058B56 8C3EC52E 000005C7 56943EC5 2E92EBFE 46FF0589
032EE6D1 FE768B57 7D053BFE 468B5664 3EC52E00 01FE46C7 FC468905 8B56903E
FE768B00 0105C756 943EC52E 3774043B 26058B56 983EC52E 568E068E 2E568C36
1E8E2E56 8C3E032E E7D1FE7E 8B187D04 3B26058B 56983EC5 2E568C36 032EE6D1
2E0000FE 46C74074 003D8356 943EC52E 9DEBFE46 FF058956 983EC52E 058B568E

983EC52E 568E068E 2E568C36 032EE6D1 FE768B67 7D053BFE 468B5664 3EC501FE
00FA46C7 C5EBFE46 FF058956 9E1E8E2E 569C3E03 2EE7D1FE 7E8B042B 26058B56
2E0588F8 D30C8B26 FA468B56 9836C42E FA7E0356 A03EC52E 2C7D0100 FA7E8100
D30C8B26 0001B856 9836C42E CDEBFA46 FF0588FA 4623FC46 8BFA7E03 56A43EC5
8BE6D3CB 8B0001BE 4B1D8B05 0156983E C52E0445 8B0A7EC5 058956A8 3EC52EE0
3EC52E0F 7D053BFE 468B5664 3EC52E00 00FE46C7 02558905 8956AC3E C52E99C6
C756B83E C52E0589 56B43EC5 2E058B56 703EC52E E5EBFE46 FF0005C6 F80356B0
2E56B436 032EE6D1 4EFE768B 4E7D053B FE468B56 7C3EC52E 0001FE46 C7000005
032EE7D1 FE7E8B24 F726058B 568A1E8E 2E56883E 032EE7D1 4FFE7E8B 56B6068E
FE46FF00 0005C756 BA1E8E2E 56B83E03 2EE7D1FE 7E8B0589 56B61E8E 2E56B43E
3D8B567C 3EC52E00 0005C756 B61E8E2E 56B43E03 2EE7D13D 8B567C3E C52EA6EB
56643EC5 2EFE4689 40058B56 7C3EC52E 000105C7 56BA1E8E 2E56B83E 032EE7D1
3E032EE7 D14FFE7E 8B56BA06 8E2E56B8 36032EE6 D14EFE76 8B4E7D05 3BFE468B
FE7E8B05 8956BA1E 8E2E56B8 3E032EE7 D1FE7E8B 24F72605 8B568A1E 8E2E5688
1C000080 C85756CB 5E5FC9A6 EBFE46FF 000005C7 56B61E8E 2E56B43E 032EE7D1
E0468D16 50D0468D 160CC483 00144DEC 9A0A76FF 0C76FF50 F0468D16 50E0468D

1650E046 8D1650D0 468D1650 80468D16 50C0468D 1608C483 00144ED0 9A5001FE
1453059A 5080468D 1650C046 8D160E76 FF1076FF 14C48300 1451699A 50F0468D
3EC52E00 00FC46C7 7B74003D 8356943E C52E0000 04C85756 CB5E5FC9 0CC48300
03FC7E8B FE4689E4 2A058A0C 5E8E0A7E C3FC7E8B 00BAE903 7C053BFC 468B5664
E6D1FC76 8B0588E8 D30C8B26 568E068E 2E568C36 032EE6D1 FC768B10 5E8E0E7E
8B26FE46 23058B56 921E8E2E 56903E03 2EE7D1FC 7E8B569E 068E2E56 9C36032E
FC468B56 643EC52E 0000FC46 C78AEBFC 46FF0588 145E8E12 7E03FC7E 8BE0D30C
8BE42A05 8AF80356 A03EC52E FE4689E4 2A058A0C 5E8E0A7E 03FC7E8B 427D053B
88145E8E 127E03FC 7E8BE42A 058AFE7E 0356A43E C52E0588 105E8E0E 7E03FC7E
1076FF13 7500043D 058B5664 3EC52EEC 8B555756 CB5E5FC9 C02BB2EB FC46FF05
1450969A 0A76FF0C 76FF0E76 FF1076FF 11EB0014 4F0E9A0A 76FF0C76 FF0E76FF
F88BE42A 01478AF0 8BE42A07 8A0A5EC5 000006C8 5756CB5E 5FC9C02B 08C48300
7DFC763B 697DFE76 3B00A0E9 037FFE3B FC4689E4 2A03478A FE4689E4 2A02478A
0001FA46 C7010EE9 0000FA46 C7087DFC 463BFE46 8B187DFC 7E3B257D FE7E3B4F
087DFC46 3BFE468B 00F1E900 02FA46C7 087DFC7E 3B00FEE9 0003FA46 C70106E9
FA46C700 CCE90009 FA46C708 7DFE7E3B 00D9E900 05FA46C7 00E1E900 04FA46C7

AAE9000A FA46C700 B2E90008 FA46C708 7DFC7E3B 157DFC76 3B00C4E9 000B01FE
763B2E7D FE763B00 92E90011 FA46C700 9AE90010 FA46C708 7DFC463B FE468B00
46C7077D FC7E3B72 EB0007FA 46C779EB 0006FA46 C7077DFC 463BFE46 8B167DFC
FA46C74E EB000CFA 46C7077D FE7E3B13 7DFC763B 5FEB000F FA46C766 EB000DFA
FA46C72E EB0012FA 46C7077D FC463BFE 468B167D FC7E3B22 7DFE7E3B 47EB000E
C7077DFC 463BFE46 8B14EB00 14FA46C7 077DFC7E 3B20EB00 15FA46C7 27EB0013
8B2E56BC 06032E02 E0C1FA46 8B0E76FF 1076FF57 560017FA 46C705EB 0016FA46
C70001FA 46C70000 08C85756 CB5E5FC9 C02B5E5F 002C0002 9A046A50 5256BE16
E4EBFE46 FF058810 5E8E0E7E 03FE7E8B 107D053B FE468B56 643EC52E 0000FE46
FA46C700 84E90375 00FA7E83 008DE903 7F00FC7E 83FC4689 48058B56 643EC52E
7603F08B E42A058A 105E8E0E 7E03FE7E 8B6C7DFC 463BFE46 8B0000FE 46C70000
3673043A 26E42A05 8A0C5E8E 0A7E03F8 8BE42A05 8A0E7E03 47FE7E8B 0C468E0A
7E03FE7E 8BE42A05 8A0E7E03 47FE7E8B F94688E4 2A058A10 5E8E0E7E 03FE7E8B
6AE9FC4E FF8CEBFE 46FF0001 FA46C705 88E42AF9 468A0E7E 0347FE7E 8B05880E
F87E83F8 46894805 8B567C3E C52E0000 FC46C700 0010C857 56CB5E5F C9C02BFF
1E8E2E56 883E032E E7D1F87E 8BFA4689 E42A058A 0C5E8E0A 7E03F87E 8B437C00

FA4603FC 66F7F046 8B014AE9 FFFFB806 7CF0463B FA468BF0 4689058B 568A01FE
8B56643E C52E0000 FE46C7FC 468925F7 FC468B56 703EC52E B7EBF84E FFFC4689
4689E42A 058A0C5E 8E0A7E03 F87E8B3D 7C053BF8 468B567C 3EC52EF8 46894805
F0468B94 7DF0463B FA468BF0 4689058B 568A1E8E 2E56883E 032EE7D1 F87E8BFA
025C8E26 3C032602 E7C1FE7E 8B568436 C42EB7EB F84EFFFE 4689FA46 03FE6EF7
1A7EC505 8B56A83E C52E0255 89058916 7EC5F656 89F44689 02558B05 03FC468B
8A145E8E 127E03F8 7E8B0089 E9037C05 3BF8468B 56643EC5 2E0000F8 46C70588
2EE7D1F2 7E8BFC46 01058B56 B61E8E2E 56B43E03 2EE7D1F2 7E8BF246 89E42A05
025C8E26 3C032602 E7C1FE7E 8B568436 C42EFE46 01058B56 BA1E8E2E 56B83E03
02558905 89185E8E 167E0302 E7C147F8 7E8BF656 89F44689 02558B05 03FC468B
2BFF68E9 F846FF05 881C5E8E 1A7E0347 F87E8BE4 2A058A10 5E8E0E7E 03F27E8B
48058B56 6C3EC52E 04C48300 1454C89A 50F0468D 16000012 C85756CB 5E5FC9C0
E42A058A 0E7EC554 31543153 B5533953 31A7FF2E D88BE0D1 0182E903 7600033D
0EC48300 1454F99A 50F0468D 1656B036 FF2E56B2 36FF2E35 FF0275FF 0A7EC550
058A105E 8E0E7E03 EE7E8B01 35E9037F EE463B40 058B5664 3EC52E00 01EE46C7
75FF0A7E 0302E7C1 4FEE7E8B 35FF0275 FF0C5E8E 0A7E0302 E7C1EE7E 8B50E42A

C550E42A 058A0E7E C5B0EBEE 46FF0EC4 83001454 F99A50F0 468D1635 FF0201FE
46C70EC4 83001455 489A50F0 468D1656 B036FF2E 56B236FF 2E35FF02 75FF0A7E
E42A058A 105E8E0E 7E03EE7E 8B00B9E9 037FEE46 3B40058B 56643EC5 2E0001EE
FF0275FF 0A7E0302 E7C14FEE 7E8B35FF 0275FF0C 5E8E0A7E 0302E7C1 EE7E8B50
75FF0A7E C550E42A 058A0E7E C5B0EBEE 46FF0EC4 83001455 489A50F0 468D1635
2E0001EE 46C70EC4 83001455 9A9A50F0 468D1656 B036FF2E 56B236FF 2E35FF02
02E7C1EE 7E8B50E4 2A058A10 5E8E0E7E 03EE7E8B 407EEE46 3B40058B 56643EC5
9A50F046 8D1635FF 0275FF0A 7E0302E7 C14FEE7E 8B35FF02 75FF0C5E 8E0A7E03
F39A50F0 468D1612 76FF1476 FF35FF56 983EC52E B3EBEE46 FF0EC483 0014559A
8B56AC3E C52E1D7D 353B5668 3EC52EF6 2BEC8B55 5756CB5E 5FC90AC4 83001455
EC8B5557 56CB5E5F C9DAEB46 02558905 890C5E8E 0A7E0302 E7C1FE8B 02558B05
5E8E0E5E 03DE8BF8 8BE42A07 8A145E8E 125E03DE 8B3B7D37 3B56681E C52EF62B
070199C1 8BC88B16 6EF7C78B 0C5E8E0A 5E0302E3 C1DE8BF9 2BC88BE4 2A078A10
5E03E3D1 DE8B3E7D 373B5668 1EC52EF6 2BEC8B55 5756CB5E 5FC9BCEB 46025711
B5089A50 5299C78B 50529916 468B3F2B 105E8E0E 5E03E3D1 DE8B3F8B 145E8E12
8B555756 CB5E5FC9 B9EB4602 57110701 0C5E8E0A 5E0302E3 C1DE8B08 C4830014

8B10468E 0E5E0302 E3C1DE8B 50529916 468B457D 353B5668 3EC52EF6 2BEC01FE
08C48300 14B5089A 50520257 1B26072B 2602558B 058B145E 8E127E03 02E7C1FE
C52EF62B EC8B5557 56CB5E5F C9B2EB46 02551105 010C5E8E 0A7E0302 E7C1FE8B
105E8E0E 5E03DE8B 0D790002 7F830C5E 8E0A5E03 02E3C1DE 8B5C7D37 3B56681E
FAE2D8D1 FAD106E3 124E8B02 578B078B 0C5E8E0A 5E0302E3 C1DE8B3B EB0007C6
0788C78B 105E8E0E 5E03DE8B 0CEBFF07 C6105E8E 0E5E03DE 8B0D7E00 FF3DF88B
001C04B4 001C04B2 001C04B0 001C04AE 001C04AC 001C044A 00CB5E5F C99BEB46
001C0724 001C04DE 001C048C 001C046C 001C044C 001C04BA 001C04B8 001C04B6
001C0700 001C06E0 001C0728 001C0720 001C0726 001C05E0 001C04E0 001C04BE
C52E05D9 9B127EC5 1DD99B61 6A3EC52E 05D99B0E 7EC50008 36C85756 001C03EA
9B61763E C52E05D9 9B227EC5 1DD99B61 723EC52E 05D99B1E 7EC51DD9 9B616E3E
08C48300 14B4139A 0014B3B3 9A0CD826 9B05D99B 61723EC5 2E616A36 C42E1DD9
B4139A00 14B3B39A 0CD8269B 05D99B61 763EC52E 616E36C4 2E058961 7A3EC52E
15896182 3EC52E61 863EF72E 99058B61 7A3EC52E 0589617E 3EC52E08 C4830014
0000EE46 C7058961 883EC52E 02E0C105 89617A3E C52E0403 26058B61 7A36C42E
618C3E03 2E02E7C1 EE7E8B99 C68BF08B EE6EF705 8B617A3E C52E297D 04EE7E83

830014D3 B79A35FF 61883EC5 2E016AD1 EBEE46FF 02558905 89618E1E 8E2E01FE
5F003400 029A35FF 61883EC5 2E00FF68 50525756 02558905 8961903E C52E04C4
0A76FF0C 76FF2676 FF2876FF 2A76FF2C 76FF0600 E9037500 3D836194 3EC52E5E
0014C0BE 9AD90568 046A006A 006A006A 1374003D 832A7EC5 0CC48300 14AEF59A
2E9B1045 DD9B267E C5147400 14B3AE9A 61981EDC 2E9B1845 DD9B267E C50AC483
76C40AC4 830014C0 BE9AD905 68046A00 6A006A00 6A137500 14B3AE9A 61981EDC
C42EF85E D99B2074 DC269B10 45DD9BFC 5ED99B28 74DC269B 1845DD9B 267EC526
34D8269B F846D99B 616E36C4 2E1DD99B 61A03EC5 2E34D826 9BFC46D9 9B616A36
06DD2E9B F7CA9EDD 9B0CD826 9B05D99B 167EC561 6A36C42E 1DD99B61 A43EC52E
2E08C483 0014B413 9A0014B3 B39AF446 D99BF45E D99BE0D9 9BF7CAA6 DC9B61A8
FF61B03E C52E0776 0014B3AE 9A61981E DC2E9B25 DE9BF446 D99B0589 61B03EC5
F7CAA6DC 9B61A806 DD2E9BF7 CA9EDD9B 0CD8269B 05D99B1A 7EC5616E 36C42E05
9B058961 B43EC52E 08C48300 14B4139A 0014B3B3 9AF446D9 9BF45ED9 9BE0D99B
0C458B26 7EC505FF 61B43EC5 2E077600 14B3AE9A 61981EDC 2E9B25DE 9BF446D9
616A36C4 2E058961 C03EC52E 08458B26 7EC50589 61B83EC5 2E058961 BC3EC52E
3EC52E08 C4830014 B4139A00 14B3B39A 0CD8269B FC76D89B 05DF9B61 BC3EC52E

0014B3B3 9A0CD826 9BF876D8 9B05DF9B 61C03EC5 2E616E36 C42E0589 61C401FE
7EC50589 61CC3EC5 2E040326 61B436C4 2E058961 C83EC52E 08C48300 14B4139A
03458861 D03EC52E 0001B81B 7504F27E 83F04689 02458BF2 4689E42A 01458A26
4E8B0001 B81C7D04 EE7E8300 00EE46C7 27EB0588 E42A0145 88E42A02 4588E42A
8B4F3C8B 61B836C5 2EDEEBEE 46FF0105 C6F90361 D03EC52E 0A74F046 23E0D3EE
8B158914 03266186 3EF72E99 058B61B8 3E8B2E61 BA068E2E E45689E2 468999C7
D03EC52E 547D04EE 7E83FFFF EC46C700 00EE46C7 058961D4 3EC52E2C F726F246
E7C1EE7E 8B99C68B F08BEC6E F7058B61 B83EC52E EC46FF29 75013D80 EE7E0361
1E8E2E61 D83E032E 02E7C1EE 7E8B19EB 02558905 8961DA1E 8E2E61D8 3E032E02
458961D8 3EC52ED2 2B058B61 D43EC52E A6EBEE46 FF000002 45C70000 05C761DA
8B61DA1E 8E2E61D8 3E032E02 E7C1EE7E 8B4F7C00 EE7E8300 03EE46C7 12558910
2E61D83E 032E02E7 C147EE7E 8B267500 3D80EE7E 0361D03E C52E3375 02450B05
016AABEB EE4EFF02 55890589 61D83E03 2E02E7C1 EE7E8B02 558B058B 61DA1E8E
C52E61B0 36C42E02 55890589 61DC3EC5 2E04C483 0014D3B7 9A35FF61 883EC52E
C52E042B 26058B61 7A3EC52E 61E036C4 2E058961 E03EC52E 04032605 8B61C43E
618E1E8E 2E618C3E 032E02E7 C1EE7E8B 647D04EE 7E830000 EE46C705 8961E43E

9A35FF61 B03EC52E 00FF6850 5202558B 050361DC 3EC52E57 56D84689 058B01FE
50520254 8B260403 26D84603 058B61E0 3EC52E61 DC36C42E 57565E5F 00340002
40058B61 7A3EC52E 016A96EB EE46FF5E 5F003400 029A35FF 61E43EC5 2E00FF68
9BDE5ED9 9B05D99B 61A03EC5 2E025589 058961E8 3EC52E04 C4830014 D3B79A50
7EEE463B 40058B61 C43EC52E 0000EE46 C7000005 C761EC3E C52EDA5E D99BEED9
C42E1D72 0014B3AE 9A61F01E DC2E9BDA 46D99BDA 5ED99BDA 46D89BDE 46D99B5C
61E836C4 2ECEEBDA 6ED89B61 F006DD2E 9B05FE02 5C8E263C 0326EE7E 8B61E836
20006897 EBEE46FF 000105C7 61EC3EC5 2E097401 3D80025C 8E263C03 26EE7E8B
0A76FF0C 76FF5052 2A76FF2C 76FF0255 89058961 F83EC52E 02C48300 14D36C9A
61F83EC5 2E50F7D8 868D1657 56012EE9 0374003D 832A7EC5 0CC48300 14AF419A
D49689F7 D2868902 558B058B 61F83EC5 2E5E5F00 2C00029A 08006835 FF0275FF
00EE46C7 5E7DF246 3BEC468B 0000EC46 C70000EA 46C70000 05C761FC 3EC52EF7
D8858BF9 03FE031F 16FD8B09 E6C1EC76 8BC88BE0 D1EE468B 4D740100 EE7E8100
FFEA7E8B 000105C7 61FC3EC5 2E0974EE 463BF7D6 868906F8 C1002005 3FFF25F7
C70000E6 46C79AEB EC46FFAC EBEE46FF 0588F7D6 868BF7D4 9E8EF7D2 BE03EA46
E676FFE8 76FFE276 FFE476FF 620036FF 2E620236 FF2E2A76 FF2C76FF 0000E846

830014B0 129A0A76 FF0C76FF 026A006A 61A436FF 2E61A636 FF2E026A 016A01FE
0275FF62 003EC52E E676FFE8 76FF006A 006A572C 76FF3975 003D832A 7EC520C4
B43EC52E 40058B61 7E3EC52E 0FEB1174 003D832A 7EC510C4 830014B0 4B9A35FF
3B61CC3E C52E097C 053B0A46 8B61B43E C52E0000 0EC85756 CB5E5FC9 9B058961
46DF9B61 A43EC52E F2468905 2B0A468B 61B43EC5 2E01AFE9 61903EC5 2E087E05
FA468D16 006A1076 FF1276FF FE468908 C4830014 B4139A00 14B3B39A 0DD89BF2
F8768B01 58E9037C 04F87E83 0000F846 C70EC483 00145FE0 9AFE76FF F276FF50
2EF44689 02541326 04032699 058B61B0 3EC52E61 8E068E2E 618C3603 2E02E6C1
8B61DA1E 8E2E61D8 3E032E02 E7C1F87E 8B00FEE9 0374013D 80F87E03 61D03EC5
50042B26 058B61C4 3EC52E61 8236C42E 77750001 3D058B61 EC3EC52E F6468905
8B0503F4 468B61DC 3EC52E50 52FC568B FA4603F6 468B35FF 0275FF61 E83EC52E
61C43EC5 2E61DC36 C42E5B74 003D8361 823EC52E 0EC48300 14C4D29A 50520255
263C0326 4FF47E03 3D8B61C4 3EC52E98 058A025C 8E263C03 264F4FF4 7E033D8B
568BFA46 03F6468B 50520255 8B0503F4 468B61DC 3EC52E57 562AEB05 88025C8E
2E575652 7500013D 058B61FC 3EC52E5E 5F002C00 029A35FF 61C43EC5 2E5052FC
F83EC52E 35FF61C4 3EC52E50 520503F4 468B5052 02558B05 03F4468B 61DC3EC5

50520255 8B0503F4 468B61DC 3EC52E57 5620EB00 2C00239A 35FF0275 FF6101FE
558B058B 61DC3EC5 2EFE9FE9 F846FF5E 5F003400 029A35FF 61C43EC5 2E00FF68
3EC52E01 04E90374 00127E83 000008C8 5756CB5E 5FC99B02 55890589 0C7EC502
FC468902 54132604 03269905 8B620C3E C52E6208 36C42E2A 74050B02 458B6204
8B067505 0B02458B 62043EC5 2E7072FC 463B757C 077FFE56 3B990C46 8BFE5689
05896208 3EC52E02 54132604 03269905 8B620C3E C52E6208 36C42E14 EB990C46
36FF2E62 1036FF2E 621236FF 2E621436 FF2E6216 36FF2E14 76FF1676 FF025589
0014B071 9A35FF02 75FF6200 3EC52E62 0436FF2E 620636FF 2E620C36 FF2E620E
558B058B 62043EC5 2E4A7205 3B4E7C06 7F02553B 990C468B 62083EC5 2E18C483
990C468B 620836C4 2EFE5689 FC468902 558B058B 62103EC5 2EFA5689 F8468902
55890589 0E7EC5FA 568BF846 03058BFE 5E8EFC7E 03E7D1F8 8B02541B 26042B26
3EC52E04 C4830014 D3F99A35 FF0275FF 61903EC5 2E000002 C85756CB 5E5FC902
C52E08C4 830014B0 849A35FF 0275FF62 003EC52E 50FE468D 164D7400 3D836194
830014D3 F99A35FF 0275FF61 E83EC52E 04C48300 14D3F99A 35FF0275 FF61DC3E
001C1324 001C1320 CB5E5FC9 04C48300 14D3F99A 35FF0275 FF61F83E C52E04C4
133C001C 03B6001C 135E0002 001C137C 001C134C 001C134E 001C132C 001C1328

3FE00000 00000000 001C1348 001C1344 00000000 00000000 001C03C6 001C01FE
001C1356 001C1332 001C1330 001C1336 001C1334 001C1350 001C1352 001C1354
001C137E 001C1378 001C1376 001C1374 001C1338 001C1360 001C135C 001C1358
001C138E 001C131C 001C1318 001C1340 001C1380 001C1382 3FF00000 00000000
8D16FF6A 35FF6AC2 3EC52E57 560000F6 46C70000 0AC85756 001C1386 001C138A
F6468D16 006A5756 107400F6 7E83FE46 895E5F00 149B8C9A 50F6468D 1650FC46
023D058B F87EC5FA 5689F846 8902C483 0014D7E6 9AFE76FF 5E5F0014 9A4C9A50
C52E09EB 05896AC6 3EC52EFC 468B0C75 00023D05 8BF87EC5 6E750004 3D057400
3DC56ACE 3EC52E02 C4830014 272E9A0C 75FF3DC5 6ACA3EC5 2E000005 C76AC63E
57561074 00F67E83 5E5F0014 9B0C9A50 F6468D16 016AFC76 FF575600 000845C7
03740001 3D058BF8 7EC5FF3D E900142B 069A5E5F 00149A4C 9A50F646 8D16006A
006A5756 107400F6 7E835E5F 00149B0C 9A50F646 8D16016A FC76FF57 56FF30E9
5F001499 EC9A50F6 468D1635 FF6AC23E C52E5756 5E5F0014 9A4C9A50 F6468D16
7EC50000 08C85756 CB5E5FC9 FEDFE95E 5F00149A 4C9A50F6 468D1600 6A57565E
1B7F000F 3D04C483 0014D778 9A0A76FF 0C76FF13 740A460B 0C468B00 0005C712
05C7127E C50A7E00 143D04C4 830014D7 789A0E76 FF1076FF 1D740E46 0B10468B

3D83127E C5FE4689 5E5F0014 9A8C9A12 76FF1476 FF256A57 560122E9 000601FE
F87EC508 750A460B 0C468BFA 5689F846 8902C483 0014D7E6 9A500103 E9037400
750E460B 10468B08 C4830014 D7469AF8 76FFFA76 FF0A76FF 0C76FF14 EB0005C6
830014D7 469A5000 1005F846 8BFA76FF 0E76FF10 76FF18EB 001045C6 F87EC509
EC9A1276 FF1476FF 6AD236FF 2E6AD436 FF2EFE76 FF006A57 560014D4 B49A08C4
36FF2E6A D436FF2E 006A5756 75750005 3D058B12 7EC50014 D5069A5E 5F00149A
FF2E006A 57564F75 003D8312 7EC5FC46 895E5F00 149BCC9A 571476FF 006A6AD2
FC76FF57 562E7500 3D83127E C55E5F00 149B2C9A 571476FF 6AD236FF 2E6AD436
FF1476FF 6AD236FF 2E6AD436 FF2EFE76 FF006A57 565E5F00 149A2C9A 571476FF
F446C700 00F246C7 000AF846 C700003A C85756CB 5E5FC95E 5F00149A EC9A1276
B6A89A6A DA36FF2E 6ADC36FF 2E6ADE36 FF2E6AE0 36FF2E00 0005C712 7EC50000
36FF2E6A E636FF2E 6AE836FF 2E2075C2 0B025589 05896AD6 3EC52E08 C4830014
0C9A1276 FF1476FF F876FF57 5608C483 001481B8 9A500024 056AE206 8B2E6AE4
9A571476 FF006A57 56028BE9 0374003D 83127EC5 05896AC2 3EC52E5E 5F00149A
7600C13D FFFD05E4 2AF7468A 026EE903 74003D83 127EC5F7 46885E5F 00149B4C
FF006A62 18680E50 E42AF746 8A5756F7 468800C1 B803EBFF FD05E42A F7468A0A

05896AEA 3EC52E5E 5F00149A 6C9A1276 FF1476FF 016A0800 68F276FF F47601FE
127EC5FC 46895E5F 00149A8C 9A571476 FF0C6A57 560219E9 0374003D 83127EC5
0A468B3D C5025589 05896ACE 3EC52E02 C4830014 D7E69A50 01FCE903 74003D83
6ACE3EC5 2E025589 05891056 8B0E468B 3DC56ACE 3EC52E06 55890445 890C568B
2E6AF036 FF2EFC76 FF006A57 5600000A 45C73DC5 6ACE3EC5 2E000108 45C73DC5
016A5756 0188E903 74003D83 127EC55E 5F00149A EC9A1276 FF1476FF 6AEE36FF
F436FF2E 50575601 6BE90374 003D8312 7EC5FA46 895E5F00 149B6C9A 571476FF
43E90374 003D8312 7EC5FE46 895E5F00 149BCC9A 571476FF 006A6AF2 36FF2E6A
6ACA3EC5 2E058B6A C23EC52E 02558905 896ACA3E C52E02C4 830014D7 E69A5001
896AF63E C52E5E5F 00149ACC 9A1276FF 1476FF00 6A016A00 6A575608 45893DC5
E42AE846 8A06C483 0014BC6C 9A016A50 C6468D16 00F8E903 74003D83 127EC505
2E6B0606 8B2E2B74 003D836A FA3EC52E 000005C7 6AFE3EC5 2E05896A FA3EC52E
029A196A 206A6B0A 36FF2E6B 0C36FF2E 57560255 8905896B 023EC52E 6B08168B
9A1276FF 1476FF02 6A575600 8FE90374 000C7D83 3DC56ACA 3EC52E5E 5F003400
F05689EE 468902C4 830014D7 E69A5073 75003D83 127EC5EC 46895E5F 00149A8C
1276FF14 76FF35FF 6AF63EC5 2EEC76FF 35FF6AC2 3EC52E57 56000205 C7EE7EC5

76FFFF6A 016A35FF 6AF63EC5 2E575635 75003D83 127EC55E 5F00149B AC9A01FE
9A571476 FFEC76FF 57561075 003D8312 7EC5EA46 895E5F00 149BEC9A 1276FF14
468B3DC5 6ACE3EC5 2E000005 C70E7EC5 000002C8 5756CB5E 5FC95E5F 00149A2C
006A006A 006A006A 006A5974 000A7D83 3DC56ACE 3EC52E02 55890589 0C568B0A
74000C7D 833DC56A CA3EC52E 10C48300 1490779A 6B0E36FF 2E6B1036 FF2E006A
C4830014 C0BE9A15 0C68006A 006A006A 006A0BEB 111F6800 6A006A00 6A006A0D
2E0112E9 03740008 7D833DC5 6ACE3EC5 2E0122E9 02C48300 14D8029A 1717680A
6B120EDC 2E9B0474 DA269B05 DB9B3DC5 35C46ACE 3EC52EFE 4689058B 6AFE3EC5
7FFE463B 00D5E903 7E00143D 05896AFE 3EC52E08 C4830014 B4139A00 14B3B39A
76FF0013 05C70475 00143D05 8B6AFE3E C52E5F74 003D836A FA3EC52E 00CDE903
C52E5052 FE46036B 0C168B2E 6B0A068B 2E50FE46 2B058B6A FE3EC52E 0E76FF10
C56B023E C52E0275 FF3DC56B 023EC52E 0B6A056A 35FF6B1A 3EC52E35 FF6B1E3E
6AFE3EC5 2E206A6B 0A36FF2E 6B0C36FF 2E575664 EB16C483 0014D0BE 9A35FF3D
FF2E6B0C 36FF2E00 05C63C03 266B0A3E C52E6AFE 36C42E5E 5F003400 029A35FF
2E0CC483 001481B8 9A35FF02 75FF6AD6 3EC52E6B 2236FF2E 6B2436FF 2E6B0A36
026A5756 00000AC8 5756CB5E 5FC99B04 C4830014 B90B9A35 FF0275FF 6AD63EC5

E69A5001 19E90374 003D830A 7EC5FA46 895E5F00 149A8C9A 0A76FF0C 76FF01FE
9A000008 45C73DC5 6ACA3EC5 2E000105 C7FC7EC5 FE5689FC 468902C4 830014D7
069A5E5F 00149BEC 9A0A76FF 0C76FF00 6A016A35 FF6AF63E C52E5756 0014D4B4
149BAC9A 0A76FF0C 76FF35FF 6AF63EC5 2EFA76FF 35FF6AC2 3EC52E57 560014D5
F646895E 5F00149B EC9A0A76 FF0C76FF FF6A016A 35FF6AF6 3EC52E57 565E5F00
3EC52E57 565E5F00 149A2C9A 570C76FF FA76FF57 56008BE9 0374003D 830A7EC5
6A6AEE36 FF2E6AF0 36FF2E00 6A57565E 5F00149A AC9A0A76 FF0C76FF 35FF6AF6
36FF2E00 6A57563D 75003D83 0A7EC5F8 46895E5F 00149BCC 9A0A76FF 0C76FF00
9A2C9A0A 76FF0C76 FFF876FF 57565E5F 00149B2C 9A570C76 FF6AEE36 FF2E6AF0
128E001C 128CCB5E 5FC904C4 830014B9 729A35FF 0275FF6A D63EC52E 5E5F0014
11F9001C 0EDE001C 11F7001C 11F0001C 1294001C 1230001C 1288001C 1284001C
0A76001C 1258001C 1292001C 1290001C 1256001C 1248001C 123A001C 1254001C
5756001C 121D001C 0A7A001C 0A744034 00000000 0000001C 1216001C 125C001C
02C4830F A068DF9A 016AEC8B 555756CB 5E5FC902 C4830FA0 68DF9A00 6AEC8B55
DF9A036A EC8B5557 56CB5E5F C902C483 0FA068DF 9A026AEC 8B555756 CB5E5FC9
555756CB 5E5FC902 C4830FA0 68DF9A04 6AEC8B55 5756CB5E 5FC902C4 830FA068

C4830FA0 68DF9A06 6AEC8B55 5756CB5E 5FC902C4 830FA068 DF9A056A EC8B01FE
9A086AEC 8B555756 CB5E5FC9 02C4830F A068DF9A 076AEC8B 555756CB 5E5FC902
5756CB5E 5FC902C4 830FA068 DF9A096A EC8B5557 56CB5E5F C902C483 0FA068DF
02C4830F A068DF9A 0B6AEC8B 555756CB 5E5FC902 C4830FA0 68DF9A0A 6AEC8B55
DF9A0D6A EC8B5557 56CB5E5F C902C483 0FA068DF 9A0C6AEC 8B555756 CB5E5FC9
555756CB 5E5FC902 C4830FA0 68DF9A0E 6AEC8B55 5756CB5E 5FC902C4 830FA068
C902C483 0FA068DF 9A106AEC 8B555756 CB5E5FC9 02C4830F A068DF9A 0F6AEC8B
68DF9A12 6AEC8B55 5756CB5E 5FC902C4 830FA068 DF9A116A EC8B5557 56CB5E5F
8B555756 CB5E5FC9 02C4830F A068DF9A 136AEC8B 555756CB 5E5FC902 C4830FA0
5FC902C4 830FA068 DF9A156A EC8B5557 56CB5E5F C902C483 0FA068DF 9A146AEC
A068DF9A 176AEC8B 555756CB 5E5FC902 C4830FA0 68DF9A16 6AEC8B55 5756CB5E
EC8B5557 56CB5E5F C902C483 0FA068DF 9A186AEC 8B555756 CB5E5FC9 02C4830F
5E5FC902 C4830FA0 68DF9A1A 6AEC8B55 5756CB5E 5FC902C4 830FA068 DF9A196A
0FA068DF 9A1C6AEC 8B555756 CB5E5FC9 02C4830F A068DF9A 1B6AEC8B 555756CB
6AEC8B55 5756CB5E 5FC902C4 830FA068 DF9A1D6A EC8B5557 56CB5E5F C902C483
CB5E5FC9 02C4830F A068DF9A 1F6AEC8B 555756CB 5E5FC902 C4830FA0 68DF9A1E

A068DF9A 216AEC8B 555756CB 5E5FC902 C4830FA0 68DF9A20 6AEC8B55 575601FE
EC8B5557 56CB5E5F C902C483 0FA068DF 9A226AEC 8B555756 CB5E5FC9 02C4830F
5E5FC902 C4830FA0 68DF9A24 6AEC8B55 5756CB5E 5FC902C4 830FA068 DF9A236A
0FA068DF 9A266AEC 8B555756 CB5E5FC9 02C4830F A068DF9A 256AEC8B 555756CB
6AEC8B55 5756CB5E 5FC902C4 830FA068 DF9A276A EC8B5557 56CB5E5F C902C483
CB5E5FC9 02C4830F A068DF9A 296AEC8B 555756CB 5E5FC902 C4830FA0 68DF9A28
830FA068 DF9A2B6A EC8B5557 56CB5E5F C902C483 0FA068DF 9A2A6AEC 8B555756
2D6AEC8B 555756CB 5E5FC902 C4830FA0 68DF9A2C 6AEC8B55 5756CB5E 5FC902C4
56CB5E5F C902C483 0FA068DF 9A2E6AEC 8B555756 CB5E5FC9 02C4830F A068DF9A
C4830FA0 68DF9A30 6AEC8B55 5756CB5E 5FC902C4 830FA068 DF9A2F6A EC8B5557
9A326AEC 8B555756 CB5E5FC9 02C4830F A068DF9A 316AEC8B 555756CB 5E5FC902
5756CB5E 5FC902C4 830FA068 DF9A336A EC8B5557 56CB5E5F C902C483 0FA068DF
02C4830F A068DF9A 356AEC8B 555756CB 5E5FC902 C4830FA0 68DF9A34 6AEC8B55
DF9A376A EC8B5557 56CB5E5F C902C483 0FA068DF 9A366AEC 8B555756 CB5E5FC9
555756CB 5E5FC902 C4830FA0 68DF9A38 6AEC8B55 5756CB5E 5FC902C4 830FA068
C902C483 0FA068DF 9A3A6AEC 8B555756 CB5E5FC9 02C4830F A068DF9A 396AEC8B

9A3C6AEC 8B555756 CB5E5FC9 02C4830F A068DF9A 3B6AEC8B 555756CB 5E5F01FE
5756CB5E 5FC902C4 830FA068 DF9A3D6A EC8B5557 56CB5E5F C902C483 0FA068DF
02C4830F A068DF9A 3F6AEC8B 555756CB 5E5FC902 C4830FA0 68DF9A3E 6AEC8B55
DF9A416A EC8B5557 56CB5E5F C902C483 0FA068DF 9A406AEC 8B555756 CB5E5FC9
555756CB 5E5FC902 C4830FA0 68DF9A42 6AEC8B55 5756CB5E 5FC902C4 830FA068
C902C483 0FA068DF 9A446AEC 8B555756 CB5E5FC9 02C4830F A068DF9A 436AEC8B
68DF9A46 6AEC8B55 5756CB5E 5FC902C4 830FA068 DF9A456A EC8B5557 56CB5E5F
8B555756 CB5E5FC9 02C4830F A068DF9A 476AEC8B 555756CB 5E5FC902 C4830FA0
5FC902C4 830FA068 DF9A496A EC8B5557 56CB5E5F C902C483 0FA068DF 9A486AEC
A068DF9A 4B6AEC8B 555756CB 5E5FC902 C4830FA0 68DF9A4A 6AEC8B55 5756CB5E
EC8B5557 56CB5E5F C902C483 0FA068DF 9A4C6AEC 8B555756 CB5E5FC9 02C4830F
5E5FC902 C4830FA0 68DF9A4E 6AEC8B55 5756CB5E 5FC902C4 830FA068 DF9A4D6A
0FA068DF 9A506AEC 8B555756 CB5E5FC9 02C4830F A068DF9A 4F6AEC8B 555756CB
6AEC8B55 5756CB5E 5FC902C4 830FA068 DF9A516A EC8B5557 56CB5E5F C902C483
CB5E5FC9 02C4830F A068DF9A 536AEC8B 555756CB 5E5FC902 C4830FA0 68DF9A52
830FA068 DF9A556A EC8B5557 56CB5E5F C902C483 0FA068DF 9A546AEC 8B555756

EC8B5557 56CB5E5F C902C483 0FA068DF 9A566AEC 8B555756 CB5E5FC9 02C401FE
5E5FC902 C4830FA0 68DF9A58 6AEC8B55 5756CB5E 5FC902C4 830FA068 DF9A576A
0FA068DF 9A5A6AEC 8B555756 CB5E5FC9 02C4830F A068DF9A 596AEC8B 555756CB
6AEC8B55 5756CB5E 5FC902C4 830FA068 DF9A5B6A EC8B5557 56CB5E5F C902C483
CB5E5FC9 02C4830F A068DF9A 5D6AEC8B 555756CB 5E5FC902 C4830FA0 68DF9A5C
830FA068 DF9A5F6A EC8B5557 56CB5E5F C902C483 0FA068DF 9A5E6AEC 8B555756
616AEC8B 555756CB 5E5FC902 C4830FA0 68DF9A60 6AEC8B55 5756CB5E 5FC902C4
56CB5E5F C902C483 0FA068DF 9A626AEC 8B555756 CB5E5FC9 02C4830F A068DF9A
C4830FA0 68DF9A64 6AEC8B55 5756CB5E 5FC902C4 830FA068 DF9A636A EC8B5557
9A666AEC 8B555756 CB5E5FC9 02C4830F A068DF9A 656AEC8B 555756CB 5E5FC902
5756CB5E 5FC902C4 830FA068 DF9A676A EC8B5557 56CB5E5F C902C483 0FA068DF
02C4830F A068DF9A 696AEC8B 555756CB 5E5FC902 C4830FA0 68DF9A68 6AEC8B55
DF9A6B6A EC8B5557 56CB5E5F C902C483 0FA068DF 9A6A6AEC 8B555756 CB5E5FC9
575600CB 5E5FC902 C4830FA0 68DF9A6C 6AEC8B55 5756CB5E 5FC902C4 830FA068
86890CC4 83001476 6C9A0E76 FF1076FF 1276FF14 76FF50FC FC868D16 000310C8
0AC48300 147AC89A 7AD236FF 2E7AD436 FF2E016A 046A501E 7400FCFA BE83FCFA

B79A016A 10006818 463BFCFE 868B0775 16463BFC FC868B02 AEE9FCFA 868B01FE
9A220C68 046A006A 006A006A 1975FC46 0BFE468B FE5689FC 468904C4 830014D3
FC468B02 55890589 7AD63EC5 2EFE568B FC468B02 6AE9FFFF B80AC483 0014C0BE
05897ADE 3EC52E02 0005FE56 8BFC468B 02558905 897ADA3E C52E0100 05FE568B
FCF0BE81 0000FCF0 86C70255 8905897A E23EC52E 030005FE 568BFC46 8B025589
8BDDEBFC F086FFFD FC858906 E0C1FCF0 868B1F16 FD03E7D1 FCF0BE8B 1B7D0100
164623E0 D3FCF88E 8B0001B8 5B7D10FC F8BE8300 00FCF886 C768740A 460B0C46
F8868BFF 42E92252 68046A00 6A006A00 6A0E7400 FCFABE83 E5EBFCF8 86FF0675
FC4603FC F6868B50 FDFC868D 160014B3 B39A7AE6 06DD2E9B FCF68689 08E0C1FC
7AEE3EC5 2E1A5603 7AF23EF7 2E991A46 8BB3EB10 C4830014 789E9A50 52FE568B
E90375FC 460BFE46 8B025589 05897AF4 3EC52E04 C4830014 D3B79A01 6A521589
866B00EE E9037C10 FCF8BE83 0000FCF8 86C70000 FCF286C7 0000FCF4 86C7FED2
164623E0 D3FCF88E 8B0001B8 05891A46 8B7AFA1E 8E2E7AF8 3E032EF8 8B0AFCF8
C77AF83E 032EF88B 0AFCF886 6B000002 45C77AF8 3E032EF8 8B0AFCF8 866B2475
FCF8866B 00010245 C77AFA1E 8E2E7AF8 3E032EF8 8B0AFCF8 866B34EB 00000645
F88E8B00 01B8FCF4 8601058B 7AEE3EC5 2E064589 FCF4868B 7AF83E03 2EF88B0A

00000445 C77AFA1E 8E2E7AF8 3E032EF8 8B0AFCF8 866B2975 184623E0 D3FC01FE
2E7AF83E 032EF88B 0AFCF886 6B34EB00 000845C7 7AF83E03 2EF88B0A FCF8866B
EE3EC52E 084589FC F2868B7A F83E032E F88B0AFC F8866B00 010445C7 7AFA1E8E
FCFCB6FF FCFEB6FF 7B0036FF 2E7B0236 FF2EFF08 E9FCF886 FFFCF286 01058B7A
FE51E903 7400FCFA BE83FCFA 86890CC4 8300142F 0E9A35FF 0275FF7A FC3EC52E
5756CB5E 5FC99BC0 2B04C483 00144A1C 9A35FF02 75FF7B00 3EC52E00 1478179A
FF7AF43E C52E04C4 830014D3 F99A35FF 0275FF7A D63EC52E 001435F0 9AEC8B55
1478879A 1276FF14 76FF0000 08C85756 CB5E5FC9 04C48300 14D3F99A 35FF0275
C50168F9 7B0436FF 2E7B0636 FF2E036A 026A5012 7400F87E 83F84689 04C48300
08068B2E 7B0A36FF 2E0E76FF 1076FF01 61E9C02B 0575203D 80057400 3D800E7E
0C76FF7B 0836FF2E 7B0A36FF 2E026AFF 6A126A08 C4830014 D7469A50 0003057B
2E0AC483 0014B4EA 9A7AFC36 FF2E7AFE 36FF2E50 520CC483 00147F11 9A0A76FF
1236FF2E 7B1436FF 2E7B1636 FF2E00C1 E9037500 F87E83F8 4689058B 7B0C3EC5
D29A7B10 36FF2E7B 1236FF2E 066A08C4 830014D7 469A5000 03057B10 068B2E7B
7400F87E 83F84689 FE468B0A C4830014 B4EA9A50 FA468D16 505204C4 8300147B
FF6A126A 000105C7 7B1C3EC5 2E0094E9 7B1836FF 2E7B1A36 FF2E036A 036A5012

0CC48300 147F119A 7B1036FF 2E7B1236 FF2E7B08 36FF2E7B 0A36FF2E 026A01FE
7E83F846 89058B7B 0C3EC52E 0AC48300 14B4EA9A 7AFC36FF 2E7AFE36 FF2E5052
1276FF14 76FF50F8 468D1634 EB7B2036 FF2E7B22 36FF2E03 6A046A50 117400F8
2E036A05 6AF876FF 197400F8 7E830CC4 6300142C 969A35FF 0275FF7A FC3EC52E
FF2E0000 02C85756 CB5E5FC9 F8468B0A C4830014 7AC89A7B 2436FF2E 7B2636FF
FF2E036A 066A5011 7400FE7E 83FE4689 04C48300 147FE99A 7AFC36FF 2E7AFE36
0E9A7B10 36FF2E7B 1236FF2E 3274003D 837B1C3E C52E34EB 7B2836FF 2E7B2A36
C89A7B2C 36FF2E7B 2E36FF2E 036A076A 50177400 FE7E83FE 468904C4 8300147C
C02B0000 0245C700 0005C70A 7EC5EC8B 555756CB 5E5FC9FE 468B0AC4 8300147A
F65EDD9B 7B3806DF 2E9B507D 0100FE7E 810000FE 46C70000 0AC85756 CB5E5FC9
14B3B39A 7B3006DC 2E9BF676 DC9B124E DC9B05DF 9B105E8E 0E7E03E7 D1FE7E8B
880C5E8E 0A7E03FE 7E8B08C4 830014B4 2E9A0014 B3B39A08 C4830014 D7A09A00
7400027D 83EE4689 058B7AF8 3EC52E00 0014C857 56CB5E5F C99BA9EB FE46FF05
F83EC52E FE5689FC 46890255 8B058B7A F43EC52E 0AEB0C56 8B0A4603 06458B0B
89F84689 02558B05 8B7AF43E C52E0AEB 0C568B0A 46031045 8B0B7400 0C7D837A
8B058B7A F43EC52E 0AEB0C56 8B0A4603 1A458B0B 7400167D 837AF83E C52EFA56

0AEB0C56 8B0A4603 24458B0B 7400207D 837AF83E C52EF656 89F44689 025501FE
F0468B39 7DEE463B EC468B00 00EC46C7 F25689F0 46890255 8B058B7A F43EC52E
468B5052 F846FFFA 568BF846 8B5052F4 46FFF656 8BF4468B 5052F046 FFF2568B
000024C8 5756CB5E 5FC9BFEB EC46FF10 C4830014 79F29A50 52FC46FF FE568BFC
7EC5DD46 88E42A05 8A127EC5 DE4688E4 2A058A0E 7EC5DF46 88E42A05 8A0A7EC5
88E42A05 8A025F8E 263F0326 F88BE42A DF468A7A D61EC42E DC4688E4 2A058A16
DE1EC42E F14688E4 2A058A02 5F8E263F 0326F88B E42ADE46 8A7ADA1E C42EF046
E42ADC46 8A7AE21E C42EF246 88E42A05 8A025F8E 263F0326 F88BE42A DD468A7A
8300144D 7F9A50F0 468D1650 E0468D16 F34688E4 2A058A02 5F8E263F 0326F88B
0588127E C5E42AE2 468A0588 0E7EC5E4 2AE1468A 05880A7E C5E42AE0 468A08C4
0E4C001C 0D7200CB 5E5FC9EC 8B555756 CB5E5FC9 C02B0588 167EC5E4 2AE3468A
001C0E5E 0002001C 0E5C3FF0 00000000 0000001C 0E58001C 0E54001C 0E50001C
001C0D7E 001C0E78 001C0E70 001C0ECC 001C0D78 001C0E74 001C0E62 001C0DAC
3FE00000 00000000 001C0DA3 001C0D9D 001C0D97 001C0D91 001C0DAA 001C0D8B
5FC904C4 830014A1 D49A5781 5E36FF2E 000005C7 815C3EC5 2EEC8B55 57560040
0D9A0A76 FF0C76FF 57815E36 FF2E066A 000005C7 815C3EC5 2EEC8B55 5756CB5E

CB5E5FC9 0AC48300 14B4EA9A 816036FF 2E816236 FF2E5052 08C48300 14A201FE
14A1E79A 0A76FF0C 76FF5781 5E36FF2E 066A0000 05C7815C 3EC52EEC 8B555756
8B555756 CB5E5FC9 0AC48300 14B4EA9A 816436FF 2E816636 FF2E5052 08C48300
08C48300 14A1FA9A 0A76FF0C 76FF5781 5E36FF2E 066A0000 05C7815C 3EC52EEC
3EC52EEC 8B555756 CB5E5FC9 0AC48300 14B4EA9A 816836FF 2E816A36 FF2E5052
5756CB5E 5FC908C4 830014A2 929A0A76 FF0C76FF 57815E36 FF2E0000 05C7815C
5756CB5E 5FC904C4 830014A3 179A5781 5E36FF2E 000005C7 815C3EC5 2EEC8B55
76FF0E76 FF1076FF 1276FF14 76FF5781 5E36FF2E 000005C7 815C3EC5 2EEC8B55
FF2E0000 05C7815C 3EC52EEC 8B555756 CB5E5FC9 10C48300 14A2CB9A 0A76FF0C
5FC910C4 830014A2 DE9A0A76 FF0C76FF 0E76FF10 76FF1276 FF1476FF 57815E36
76FF0E76 FF1076FF 57815E36 FF2E686A 000005C7 815C3EC5 2EEC8B55 5756CB5E
0AC48300 14B4EA9A 816C36FF 2E816E36 FF2E5052 0CC48300 14A2F19A 0A76FF0C
899A0A76 FF0C76FF 57815E36 FF2E0000 05C7815C 3EC52EEC 8B555756 CB5E5FC9
76FF5781 5E36FF2E 000005C7 815C3EC5 2EEC8B55 5756CB5E 5FC908C4 830014A3
0005C781 5C3EC52E EC8B5557 56CB5E5F C90AC483 0014A3E8 9A0A76FF 0C76FF0E
0EC48300 14A2B89A 0A76FF0C 76FF0E76 FF1076FF 1276FF57 815E36FF 2E086A00

2EEC8B55 5756CB5E 5FC90AC4 830014B4 EA9A8170 36FF2E81 7236FF2E 505201FE
9A0A76FF 0C76FF0E 76FF1076 FF1276FF 57815E36 FF2E066A 000005C7 815C3EC5
56CB5E5F C90AC483 0014B4EA 9A817436 FF2E8176 36FF2E50 520EC483 0014A2A5
56CB5E5F C904C483 0014A304 9A57815E 36FF2E00 0005C781 5C3EC52E EC8B5557
C4830014 A32A9A0A 76FF0C76 FF57815E 36FF2E00 0005C781 5C3EC52E EC8B5557
FF1076FF 1276FF57 815E36FF 2E000005 C7815C3E C52EEC8B 555756CB 5E5FC908
05C7815C 3EC52EEC 8B555756 CB5E5FC9 0EC48300 14A33D9A 0A76FF0C 76FF0E76
CB5E5FC9 0CC48300 14A3509A 0A76FF0C 76FF0E76 FF1076FF 57815E36 FF2E0000
0A76FF0C 76FF0E76 FF1076FF 57815E36 FF2E0000 05C7815C 3EC52EEC 8B555756
57815E36 FF2E0000 05C7815C 3EC52EEC 8B555756 CB5E5FC9 0CC48300 14A3639A
C7815C3E C52EEC8B 555756CB 5E5FC90A C4830014 A3769A0A 76FF0C76 FF0E76FF
A2209A0A 76FF0C76 FF0E76FF 1076FF12 76FF1476 FF57815E 36FF2E12 6A000005
555756CB 5E5FC90A C4830014 B4EA9A81 7836FF2E 817A36FF 2E505210 C4830014
FF0E76FF 1076FF12 76FF1476 FF57815E 36FF2E12 6A000005 C7815C3E C52EEC8B
C4830014 B4EA9A81 7C36FF2E 817E36FF 2E505210 C4830014 A2339A0A 76FF0C76
76FF1476 FF57815E 36FF2E12 6A000005 C7815C3E C52EEC8B 555756CB 5E5FC90A

FF2E8182 36FF2E50 5210C483 0014A246 9A0A76FF 0C76FF0E 76FF1076 FF1201FE
2E126A00 0005C781 5C3EC52E EC8B5557 56CB5E5F C90AC483 0014B4EA 9A818036
5210C483 0014A259 9A0A76FF 0C76FF0E 76FF1076 FF1276FF 1476FF57 815E36FF
5C3EC52E EC8B5557 56CB5E5F C90AC483 0014B4EA 9A818436 FF2E8186 36FF2E50
555756CB 5E5FC908 C4830014 A26C9A0A 76FF0C76 FF57815E 36FF2E00 0005C781
0A76FF0C 76FF0E76 FF1076FF 1276FF57 815E36FF 2E000005 C7815C3E C52EEC8B
5E36FF2E 126A0000 05C7815C 3EC52EEC 8B555756 CB5E5FC9 0EC48300 14A27F9A
818A36FF 2E50520E C4830014 A3AF9A0A 76FF0C76 FF0E76FF 1076FF12 76FF5781
6A000005 C7815C3E C52EEC8B 555756CB 5E5FC90A C4830014 B4EA9A81 8836FF2E
50520EC4 830014A3 C29A0A76 FF0C76FF 0E76FF10 76FF1276 FF57815E 36FF2E12
815C3EC5 2EEC8B55 5756CB5E 5FC90AC4 830014B4 EA9A818C 36FF2E81 8E36FF2E
8B555756 CB5E5FC9 08C48300 14A3D59A 0A76FF0C 76FF5781 5E36FF2E 000005C7
5FC908C4 830014A4 DF9A5781 5E36FF2E 0A76FF0C 76FF0000 05C7815C 3EC52EEC
EC8B5557 56CB5E5F C9058B81 903EC52E 000005C7 815C3EC5 2EEC8B55 5756CB5E
F29A0A76 FF0C76FF 0E76FF10 76FF1276 FF57815E 36FF2E00 0005C781 5C3EC52E
10CE001C 1066001C 1060001C 105A001C 1054001C 104ACB5E 5FC90EC4 830014A4

001C1136 001C1124 001C1112 001C1100 001C10EE 001C10DC 001C10D6 001C01FE
1482189A 50001205 8746068B 2E874836 FF2E500A 468D16EC 8B555756 001C1052
08C48300 1482189A 0A76FF0C 76FF500E 468D16EC 8B555756 CB5E5FC9 08C48300
568B0A46 8BF65689 F446890C 568B0A46 8B0009EE 46C70000 12C85756 CB5E5FC9
7EC508C4 83001482 189A50EE 468D1650 0E468D16 7D00F046 C7FA5689 F846890C
8B058BF8 7EC5FA56 89F84689 10568B0E 468B0000 64C85756 CB5E5FC9 0005C6F4
75F60B18 7400253D F08BE42A 058AE046 FFE07EC5 04F84683 E25689E0 46890255
C7FFFFE8 46C70020 EC46C7D7 EB06C483 0014C69C 9A560A76 FF0C76FF 03D8E903
E046FFE0 7E8B0001 EE46C713 752DFE83 F08BE42A 058AE046 FFE07EC5 FFFFEA46
2A058AE0 46FFE07E C50030EC 46C71175 30FE8300 00EE46C7 05EBF08B E42A058A
89D8F700 01EE46C7 0A7DC00B E8468905 8B02F846 83F87EC5 28752AFE 83F08BE4
6B1E7F39 FE83237C 30FE8300 00E846C7 2DEBF08B E42A058A E046FFE0 7EC5E846
2EFE83D8 EBF08BE4 2A058AE0 46FFE07E C5E84689 00302DC7 03C68BF8 8B0AE846
C5EA4689 058B02F8 4683F87E C51A752A FE83F08B E42A058A E046FFE0 7EC55875
0..EA466B 1E7F39FE 83237C30 FE830000 EA46C72D EBF08BE4 2A058AE0 46FFE07E
C527756C FE83D8EB F08BE42A 058AE046 FFE07EC5 EA468900 302DC703 C68BF88B

7578FE83 057475FE 830A746F FE830F74 64FE83F0 8BE42A05 8AE046FF E07E01FE
C68B0001 E446C7FE 5689FC46 89F25689 F046895A 169C468D F08BFFDF 25C68B07
00630058 0055004F 00441C67 FF2EFE94 E90374F9 E0073B2E 4343000E B983C2BB
84C083FC 854F84BC 849384B8 844D0078 00750073 0072006F 00670066 00650064
0E7D00DC 7E83DC46 89058B02 F84683F8 7EC58449 843884F9 85678445 84C084C0
C4830014 86309AFC 76FFFE76 FFDC76FF 0A6A2D05 C6FC46FF FC7EC5DC 4689D8F7
C5EDEB10 6AF1EB08 6ADCEB35 FF02F846 83F87EC5 0A6A0148 E9FE5689 FC468908
468900DA 83D8F7DA F7167900 DE7E8304 F84683DE 5689DC46 8902558B 058BF87E
001486A6 9AFC76FF FE76FFDC 76FFDE76 FF0A6A2D 05C6FC46 FFFC7EC5 DE5689DC
FC46890A C4830014 86A69AFC 76FFFE76 FF35FF02 75FFF87E C50A6A9C EB0AC483
086A08EC 83EA76FF FC76FFFE 76FFD5EB 106AD9EB 086A00C8 E904F846 83FE5689
468910C4 8300149D 0C9A560A C4830014 B4EA9A50 000805C4 8B16F876 FFFA76FF
C20BF656 89F44689 02558B05 8BF87EC5 0000E446 C70087E9 08F84683 FE5689FC
FE5689FC 4689F256 89F04689 F6568BF4 468B04F8 4683F64E 8C874AF4 46C70875
EBFC4EFF E47EEA46 3BF4462B FC468BEF 7C00EA7E 83117400 3D80FC46 FFFC7EC5
FF0275FF F87EC519 EB0588FC 46FFFC7E C5058B02 F84683F8 7EC50000 E446C731

FC462BE8 4603F256 8BF0468B FF31E908 C4830014 82189A0A 76FF0C76 FF3501FE
7EC51E75 30EC7E83 247400E4 7E833F75 00EE7E83 0000E646 C7057DC0 0BE64689
FFE6468B 06C48300 14C69C9A 50E42A05 8AF046FF 0A76FF0C 76FF1675 2D3D80F0
FF0C76FF 1B73FC46 3BF2568B F0468BE3 EBEC76FF 0A76FF0C 76FF0B74 C00BE64E
FC30E903 7500EE7E 83DAEB06 C4830014 C69C9A50 E42A058A F046FFF0 7EC50A76
E0EB06C4 830014C6 9C9AEC76 FF0A76FF 0C76FFFC 23E90375 C00BE64E FFE6468B
07C6FC5E C5FC4EFF FE5689FC 46895A16 FC468D0E 768B0000 0EC85756 CB5E5FC9
FC4EFF98 8752878A 2EDA8B10 76F7D22B C68B1B74 C00BF88B 1076F7D2 2BC68B00
74003F80 FC5EC507 88FC5EC5 FC4EFF98 8752878A 2EDE8BD8 EBF78B07 88FC5EC5
000016C8 5756CB5E 5FC90C56 8B0A468B E7EB0A46 FF0A5EC5 E42A078A FC46FF0F
FF1076FF 505299C6 8B0005C6 EA7EC5EA 4EFFEC56 89EA4689 5A16FF46 8D12768B
9A0E76FF 1076FF50 5299C68B 3174C20B F05689EE 468908C4 830014B6 1A9A0E76
0E4689F0 568BEE46 8B0588EA 7EC5EA4E FF988752 858A2EF8 8B08C483 0014B666
0F74003D 80EA7EC5 0588EA7E C5EA4EFF 98875285 8A2EF88B 0E468BB2 EB105689
4E7B001C 0EDE00CB 5E5FC90C 568B0A46 8BE7EB0A 46FF0A7E C5E42A05 8AEA46FF
00B446C7 00005CC8 57564645 44434241 39383736 35343332 31300000 7D4C4C55

9A2E76FF 3076FF50 D0468D16 0A76FF0C 76FF5756 01CE46C6 00FFB246 C70001FE
05898CB0 3EC52E05 89267EC5 D2468B02 68E90374 003D832E 7EC55E5F 0014CC74
14B3B39A BE56DD9B 02C48300 14B3C99A 50E42AD1 468AC65E DD9B8CB4 06DF2E9B
B3B39AC6 46DD9B00 14B3B39A BE46DD9B 05898CB6 3EC52E08 C4830014 B4139A00
B3B39AA4 66DC9BC6 46DD9BA4 5EDD9BE8 D99BC65E DD9B10C4 830014C9 B09A0014
7E8BB046 89C72B00 08B8F88B E42AD146 8A05892A 7EC508C4 830014B4 139A0014
C51DD99B 8CBE3EC5 2E05D99B 0E7EC505 898CBA3E C52E0589 E0D3B04E 8B058B2A
76DC9BE0 46DD9BBA 5ED99BF8 76DC9BE8 46DD9B1D D99B8CC2 3EC52E05 D99B127E
9BD846DB 9B1DD99B 8CC63EC5 2E15D99B 167EC5BA 76D89BDC 46DB9BB6 5ED99BF0
269B05D9 9B8CC63E C52E8CBE 36C42E1D D99B8CCA 3EC52E15 D99B1A7E C5B676D8
8CCA3EC5 2E8CC236 C42E0589 8CCE3EC5 2E08C483 0014B413 9A0014B3 B39A0CD8
C52EDC46 8B05898C D23EC52E 08C48300 14B4139A 0014B3B3 9A0CD826 9B05D99B
9B8CC236 C42E1DD9 9B8CDA3E C52E34D8 269BBA46 D99B8CBE 36C42E05 898CD63E
E23EC52E 04C48300 14D3B79A 01006824 6A1DD99B 8CDE3EC5 2E34D826 9BB646D9
830014CF 399A0A76 FF0C76FF 50E42ACE 468A5052 B476FFB2 76FF0255 8905898C
8CD63EC5 2E026A02 55890589 227EC502 558B058B 8CE23EC5 2E05892E 7EC50EC4

FF8CCE3E C52E046A 02558905 898CE63E C52E04C4 830014D3 B79A5040 058B01FE
36FF2E00 6A026A0A 76FF0C76 FF575602 55890589 1E7EC504 C4830014 D3B79A35
D08BC02B 0C74003D 832E7EC5 5E5F0014 CB8D9A2E 76FF3076 FF8CEA36 FF2E8CEC
2E8CE036 FF2EAC76 FFAE76FF 35FF0275 FF8CEA3E C52E5756 33EBAE56 89AC4689
CB5E5FC9 9B003D83 2E7EC55E 5F0014CB A29A2E76 FF3076FF 016A006A 8CDE36FF
C4830014 8A9F9A0A 76FF35FF 0275FF8C E63EC52E 1076FF12 76FF0000 36C85756
C52ED046 89E64689 058B8CB0 3EC52ECE 5689CC46 8902558B 058B8CE6 3EC52E0A
06DD2E9B 8CDA3EC5 2ED65689 D446890E 568B0C46 8BD24689 F0468905 8B8CB63E
0000E846 C70000DE 46C70000 DC46C700 E546C601 E446C6E0 5ED99B35 D89B8CEE
FE46C700 0016C857 56CB5E5F C99B04C4 830014C5 1C9A50CC 468D1600 00EA46C7
36FF2E8C F836FF2E 35FF0275 FF8CEA3E C52E5756 0000FA46 C70000FC 46C70000
14CBB79A 1076FF12 76FF50F2 468D1650 F6463D16 50F8468D 1650FA46 8D168CF6
89E7D13C 8B8CD636 C52E5B76 FA463BF8 468B016F E9037400 3D83107E C55E5F00
0326E0D1 FA468B8C F636C42E F04689EA 468B0372 C73BEC46 C9E0D1FA 462BEA7E
9AF076FF 50000205 520C76FF 0E76FF57 56025589 05898CFA 3EC52E02 548B2604
053BFE46 8B8CD63E C52EFFFF EE46C705 EBEE4689 FA462BF8 468B5E5F 002C0002

9BE90374 FFEE7E83 0977EE46 3BFC468B 00D1E903 7FFFFC7E 8300DAE9 037201FE
F8468D16 50FA468D 168CF636 FF2E8CF8 36FF2E35 FF0275FF 8CEA3EC5 2E575600
3C8B8CD6 36C52E00 A6E90374 003D8310 7EC55E5F 0014CBCC 9A1076FF 1276FF50
F04689EA 468B0372 C73BEC46 89E0D1FF FF05FA46 2BF8468B EA7E89E7 D1FC7E2B
468B8CF6 3EC52E50 520E568B 0C4603E0 D148FC46 8B5756FC 46FF0375 FFEE7E83
FA3EC52E FF2CE9FF FFFC46C7 5E5F002C 00029AF0 76FF5052 02558B05 03E0D1FA
17E9FE46 89FE4603 04232605 8B8CB03E C52E0245 8E3503E6 D1FC46FF FC768B8C
C905880C 7E03F07E 8BE42A05 88C02B0E 5E8E0C7E 0347F07E 8B187EFF FC7E83FF
5F0014CB E19A50FE 468D1635 FF0275FF 8CEA3EC5 2E575600 0002C857 56CB5E5F
D3F99A35 FF0275FF 8CE63EC5 2E04C483 0014D3F9 9A35FF02 75FF8CE2 3EC52E5E
001C1448 001C1444 001C146C 001C146E 0002001C 146A00CB 5E5FC904 C4830014
001C1470 001C1460 001C145C 001C1468 001C1464 001C1466 001C1450 001C144C
46C60000 28C85756 001C1478 001C1474 3FF00000 00000000 001C1458 001C1454
46C65FEF 46C646EE 46C649ED 46C65FEC 46C653EB 46C64DEA 46C646E9 46C60AE8
895E5F00 149B6C9A 50FA468D 16036A57 560000E0 46C758F2 46C642F1 46C64DF0
9A50FA46 8D16006A 50E8468D 16F676FF 57560161 E9FA468B 067400FA 7E83F646

```
5F00149A 8C9A50FA 468D164E 6A5756D9 7500FA7E 83F44689 5E5F0014 9BCC01FE
FF0005C6 FC7EC5FE 5689FC46 8902C483 0014D7E6 9A50C075 00FA7E83 E446895E
45881046 8B0B4588 FC7EC50E 468B08C4 830014D7 469A5000 1405520A 76FF0C76
45C70000 4645C712 45891846 8B105589 0E458916 568B1446 8B0D4588 12468B0C
00FA7E83 E246895E 5F00149A 0C9A50FA 468D16E0 76FF5756 00004A45 C7000048
037400FA 7E835E5F 00149BAC 9A50FA46 8D1650E4 76FFF476 FF5756FF 45E90374
7E83DE46 895E5F00 149B8C9A 50FA468D 1650D846 8D16FF6A E276FF57 56FF27E9
E9E90374 00FA7E83 5E5F0014 9A2C9A50 FA468D16 E476FF57 56FF03E9 037400FA
E69ADE76 FFFECFE9 037400FA 7E835E5F 001499EC 9A50FA46 8D16E276 FF5756FE
2C9A50FA 468D16DE 76FF5756 F8468905 8BDA7EC5 DC5689DA 468902C4 830014D7
C60AE846 C6000028 C85756CB 5E5FC9F8 468BFE9C E9037400 FA7E835E 5F00149A
C64DF046 C65FEF46 C646EE46 C649ED46 C65FEC46 C653EB46 C64DEA46 C646E946
83F64689 5E5F0014 9B6C9A50 FA468D16 036A5756 0000E046 C758F246 C642F146
149BCC9A 50FA468D 16006A50 E8468D16 F676FF57 560164E9 FA468B06 7400FA7E
83E44689 5E5F0014 9A8C9A50 FA468D16 4E6A5756 D97500FA 7E83F446 895E5F00
0A76FF0C 76FF0005 C6FC7EC5 FE5689FC 468902C4 830014D7 E69A50C0 7500FA7E

468B0C45 8810468B 0B4588FC 7EC50E46 8B08C483 0014D746 9A500014 055201FE
89464589 1C568B1A 468B1245 8918468B 1055890E 45891656 8B14468B 0D458812
00FA7E83 E246895E 5F00149A 0C9A50FA 468D16E0 76FF5756 4A45891E 468B4855
037400FA 7E835E5F 00149BAC 9A50FA46 8D1650E4 76FFF476 FF5756FF 42E90374
7E83DE46 895E5F00 149B8C9A 50FA468D 1650D846 8D16FF6A E276FF57 56FF24E9
E6E90374 00FA7E83 5E5F0014 9A2C9A50 FA468D16 E476FF57 56FF00E9 037400FA
E69ADE76 FFFECCE9 037400FA 7E835E5F 001499EC 9A50FA46 8D16E276 FF5756FE
2C9A50FA 468D16DE 76FF5756 F8468905 8BDA7EC5 DC5689DA 468902C4 830014D7
76FF1876 FF000002 C85756CB 5E5FC9F8 468BFE99 E9037400 FA7E835E 5F00149A
C00BFE46 8910C483 00148CFE 9A0A76FF 0C76FF0E 76FF1076 FF1276FF 1476FF16
000028C8 5756CB5E 5FC9FE46 8B0AC483 0014C0BE 9A50036A 006A006A 006A1174
5FEF46C6 46EE46C6 49ED46C6 5FEC46C6 53EB46C6 4DEA46C6 46E946C6 0AE846C6
5F00149B 6C9A50FA 468D1603 6A575600 00E046C7 58F246C6 42F146C6 4DF046C6
FA468D16 006A50E8 468D16F6 76FF5756 0180E9FA 468B0674 00FA7E83 F646895E
00149A8C 9A50FA46 8D1600B4 685756D9 7500FA7E 83F44689 5E5F0014 9BCC9A50
0105C6FC 7EC5FE56 89FC4689 02C48300 14D7E69A 50BF7500 FA7E83E4 46895E5F

468B0B45 88FC7EC5 0E468B08 C4830014 D7469A50 00140552 0A76FF0C 76FF01FE
8B1A468B 12458918 468B1055 890E4589 16568B14 468B0D45 8812468B 0C458810
2076FF22 76FF5000 4E05FC46 8BFE76FF 57564A45 891E468B 48558946 45891C56
FA7E83E2 46895E5F 00149A0C 9A50FA46 8D16E076 FF57565E 5F002C00 029A666A
7400FA7E 835E5F00 149BAC9A 50FA468D 1650E476 FFF476FF 5756FF26 E9037400
83DE4689 5E5F0014 9B8C9A50 FA468D16 50D8468D 16FF6AE2 76FF5756 FF08E903
E9037400 FA7E835E 5F00149A 2C9A50FA 468D16E4 76FF5756 FEE4E903 7400FA7E
9ADE76FF FEB0E903 7400FA7E 835E5F00 1499EC9A 50FA468D 16E276FF 5756FECA
9A50FA46 8D16DE76 FF5756F8 4689058B DA7EC5DC 5689DA46 8902C483 0014D7E6
FE468D16 000002C8 5756CB5E 5FC9F846 8BFE7DE9 037400FA 7E835E5F 00149A2C
50FE468D 16000002 C85756CB 5E5FC900 0225FE46 8B06C483 0014BC6C 9A056A50
C85756CB 5E5FC900 02B803EB 0004B805 740001FE 46F706C4 830014BC 6C9A056A
7500F67E 83FC4689 5E5F0014 9B6C9A50 F6468D16 016A5756 0000F646 C700000A
83FE4689 5E5F0014 9BCC9A50 F6468D16 006A97FE 36FF2E98 0036FF2E 50575643
B8057500 013D0245 8BF87EC5 FA5689F8 468902C4 830014D7 E69A501F 7500F67E
16016A57 561D7500 0A7E8300 00F846C7 000008C8 5756CB5E 5FC9C02B 02EB0001

2E0A76FF 57563BEB C02B0474 00F87E83 0A46895E 5F00149B 6C9A50F8 468D01FE
D67500F8 7E83FE46 895E5F00 149BCC9A 50F8468D 16006A97 FE36FF2E 980036FF
C700000A C85756CB 5E5FC90C 458BFA7E C5FC5689 FA468902 C4830014 D7E69A50
EBC02B04 7400F67E 83FC4689 5E5F0014 9B6C9A50 F6468D16 016A5756 0000F646
46895E5F 00149BCC 9A50F646 8D16006A 97FE36FF 2E980036 FF2EFC76 FF57563B
CB5E5FC9 04458BF8 7EC5FA56 89F84689 02C48300 14D7E69A 50D67500 F67E83FE
6A006A04 6A50FA46 8D16066A FE46890A 6EF70C46 8B0000F8 46C70000 08C85756
D08BC02B 067400F8 7E83F846 8910C483 00148CFE 9A980236 FF2E9804 36FF2E00
FA46890C 568B0A46 8B0000F8 46C70000 08C85756 CB5E5FC9 FC568BFA 468B06EB
8300148C FE9A9806 36FF2E98 0836FF2E 006A006A 026A50FA 468D1606 6AFC5689
2E980C36 FF2E006A 006A036A 006A006A 006AEC8B 555756CB 5E5FC9F8 468910C4
6A006A03 6A006A00 6A006AEC 8B555756 CB5E5FC9 10C48300 148CFE9A 980A36FF
0C7EC500 0008C857 56CB5E5F C910C483 00148CFE 9A980E36 FF2E9810 36FF2E00
CC9A0C76 FF0E76FF 006A9812 36FF2E98 1436FF2E 50001493 B79A5756 000005C7
895E5F00 149B6C9A 570E76FF 016A5756 3A75003D 830C7EC5 FE46895E 5F00149B
E7D10A7E 8BFA5689 F8468902 C4830014 D7E69AFE 76FF2075 003D830C 7EC5FC46
```

```
9A575600 0005C70C 7EC50000 06C85756 CB5E5FC9 0589FC46 8BFA5E8E F80301FE
46895E5F 00149BCC 9A0C76FF 0E76FF00 6A981236 FF2E9814 36FF2E50 001493B7
8EF803E7 D10A7E8B FC5689FA 468902C4 830014D7 E69A5023 75003D83 0C7EC5FE
2E575600 00F646C7 00000AC8 5756CB5E 5FC9C02B 02EB0001 B8057400 3D83FC5E
00F67E83 FE46895E 5F00149B 8C9A50F6 468D1650 FC468D16 FF6A35FF 98163EC5
F8468902 C4830014 D7E69AFE 76FF5E5F 00149A4C 9A50F646 8D16006A 57561074
5E5F0014 9B0C9A50 F6468D16 016AFC76 FF57561A 7500023D 058BF87E C5FA5689
0014C857 56CB5E5F C95E5F00 149A4C9A 50F6468D 16006A57 5610EB00 14D8029A
6C9A50EC 468D1601 6A575600 00EC46C7 0000F046 C70000EE 46C7000A F646C700
5F00149B 6C9A50EC 468D1600 6A575600 E7E90374 00EC7E83 FC46895E 5F00149B
97FE36FF 2E980036 FF2EFC76 FF575600 C7E90374 00EC7E83 0589981A 3EC52E5E
0014D7E6 9A50009E E9037400 EC7E83FE 46895E5F 00149BCC 9A50EC46 8D16006A
8998163E C52E5E5F 00149A0C 9A50EC46 8D16F676 FF5756FA 5689F846 8902C483
587500EC 7E83F346 885E5F00 149B4C9A 50EC468D 16006A57 56717500 EC7E8305
8A5756F3 468800C1 B803EBFF FD05E42A F3468A0A 7600C13D FFFD05E4 2AF3468A
00149A6C 9A50EC46 8D16006A 040068EE 76FFF076 FF006A95 CE680E50 E42AF346

5E5FC9EC 468B0A45 89F87EC5 058B9816 3EC52E0D 7500EC7E 83F44689 5E5F01FE
FF2E9824 36FF2E50 001493B7 9A575630 75003D83 981E3EC5 2E000002 C85756CB
75003D83 0A7EC505 89981E3E C52E5E5F 00149BCC 9A0A76FF 0C76FF00 6A982236
5FC9FE46 895E5F00 149BEC9A 0A76FF0C 76FFFF6A 016A35FF 981E3EC5 2E57561D
C95E5F00 149B0C9A 0A76FF0C 76FF016A 35FF981E 3EC52E57 56EC8B55 5756CB5E
001C1440 001C141E 001C140E 001C13FE 001C13F8 001C13F0 001C1428 00CB5E5F
CA5D0F89 26065EC4 0A75C923 08B80000 9AEC8B55 001C1434 001C143E 001C1442
CA5D0F89 26065EC4 0A75C923 08A80000 9AEC8B55 00EDEB00 1499869A D2320002
CA5D0F89 26065EC4 0A75C923 08F00000 9AEC8B55 00EDEB00 1499869A D2320008
CA5D0F89 26065EC4 0A75C923 08680000 9AEC8B55 00EDEB00 1499869A D232000C
CA5D0F89 26065EC4 0A75C923 08580000 9AEC8B55 00EDEB00 1499869A D232000A
CA5D0F89 26065EC4 0A75C923 08700000 9AEC8B55 00EDEB00 1499869A D2320008
CA5D0F89 26065EC4 0A75C923 08780000 9AEC8B55 00EDEB00 1499869A D2320006
CA5D0F89 26065EC4 0A75C923 08200000 9AEC8B55 00EDEB00 1499869A D2320006
CA5D0F89 26065EC4 0A75C923 08E00000 9AEC8B55 00EDEB00 1499869A D2320006
CA5D0F89 26065EC4 0A75C923 08600000 9AEC8B55 00EDEB00 1499869A D2320006

0F892606 5EC40A75 C92308E8 00009AEC 8B5500ED EB001499 869AD232 000801FE
A09A5306 065EC450 5050C033 52511179 C90B00ED EB001499 869AD232 000CCA5D
8B55000E CA5D0000 07C72606 5EC41F04 9000009A 1EEC8B55 00CBFFFF B8001499
0D738000 F9810675 02FB800B EB1A7280 00F98108 7501FB80 2574DB0A 0A5E8BEC
C9231F03 6000009A 1EEC8B55 0006CAFF FFB85D59 5A065EFF 006A006A 52515251
C9231F03 1800009A 1EEC8B55 00EFEB00 1499B69A 0006CA5D 0F892606 5EC40A75
C9231F03 7000009A 1EEC8B55 00EFEB00 1499B69A 0006CA5D 0F892606 5EC40A75
C9231F03 8000009A 1EEC8B55 00EFEB00 1499B69A 0006CA5D 0F892606 5EC40A75
C9231F03 3800009A 1EEC8B55 00EFEB00 1499B69A 0006CA5D 0F892606 5EC40A75
C9231F03 2800009A 1EEC8B55 00EFEB00 1499B69A 0014CA5D 0F892606 5EC40A75
C9231F03 7800009A 1EEC8B55 00EFEB00 1499B69A 0006CA5D 0F892606 5EC40A75
C9231F03 3000009A 1EEC8B55 00EFEB00 1499B69A 0006CA5D 0F892606 5EC40A75
C9231F02 E000009A 1EEC8B55 00EFEB00 1499B69A 000ACA5D 0F892606 5EC40A75
C9231F04 6000009A 1EEC8B55 00EFEB00 1499B69A 000CCA5D 0F892606 5EC40A75
C9231F04 B000009A 1EEC8B55 00EFEB00 1499B69A 0008CA5D 0F892606 5EC40A75
C9231F03 F000009A 1EEC8B55 00EFEB00 1499B69A 000ACA5D 0F892606 5EC40A75

1F040000 009A1EEC 8B5500EF EB001499 B69A0006 CA5D0F89 26065EC4 0A7501FE
1F043000 009A1EEC 8B5500EF EB001499 B69A0006 CA5D0F89 26065EC4 0A75C923
1F045800 009A1EEC 8B5500EF EB001499 B69A000C CA5D0F89 26065EC4 0A75C923
1F041800 009A1EEC 8B5500EF EB001499 B69A000A CA5D0F89 26065EC4 0A75C923
1F043800 009A1EEC 8B5500EF EB001499 B69A000C CA5D0F89 26065EC4 0A75C923
1F04A000 009A1EEC 8B5500EF EB001499 B69A000A CA5D0F89 26065EC4 0A75C923
1F03D000 009A1EEC 8B5500EF EB001499 B69A0006 CA5D0F89 26065EC4 0A75C923
1F046800 009A1EEC 8B5500EF EB001499 B69A0008 CA5D0F89 26065EC4 0A75C923
C9230578 00009AEC 8B5500EF EB001499 B69A0008 CA5D0F89 26065EC4 0A75C923
C9230600 00009AEC 8B5500ED EB001499 869AD232 000ECA5D 0F892606 5EC40A75
C9230588 00009AEC 8B5500ED EB001499 869AD232 000ACA5D 0F892606 5EC40A75
C92305B0 00009AEC 8B5500ED EB001499 869AD232 000ECA5D 0F892606 5EC40A75
C9230650 00009AEC 8B5500ED EB001499 869AD232 000ECA5D 0F892606 5EC40A75
9A0C46DD 00004EC8 575600ED EB001499 869AD232 000ACA5D 0F892606 5EC40A75
5689FC46 89A13495 8B2EA132 858B2E02 E7C1F88B 08C48300 14B5549A 0014B3B3
F846FFF8 7EC59805 8AFC46FF FC7EC5FA 5689F846 8918568B 16468B24 74C20BFE
```

50F4468D 1650B446 8D160006 1446C705 7D00147E 8301DCE9 EB75C00A 058801FE
5689FC46 8918C483 00149F46 9A0A76FF 0014B3B3 9A0C46DD 1476FF50 F6468D16
FA568BF8 468BF3EB F846FF05 74003D80 F87EC5FA 5689F846 895C7567 0A7E83FE
4689FC46 2BF8468B E2EBF84E FF057530 FF7D80F8 7EC50E74 FC463B05 75FE563B
46C7057C B2463BF6 468B0DEB 00650A46 C7077DF6 463B0005 05087CFD F67E83B2
7E832D05 C6F846FF F87EC509 7400F47E 83FA5689 F8468918 568B1646 8B000014
A1121EDC 2E0C46DD 0588F846 FFF87EC5 98058AFC 46FFFC7E C500A5E9 0374650A
74003D80 FC7EC520 7E00147E 832E05C6 F846FFF8 7EC5F64E FF037400 14B3AE9A
C6F846FF F87EC5DA EB144EFF 0588F846 FFF87EC5 0030B803 EB98058A FC46FF08
F7F6468B 2D05C6F8 46FFF87E C511EB2B 05C6F846 FFF87E8B 0B7C00F6 7E836505
9AF876FF FA76FF0A C4830014 81D49AF8 76FFFA76 FFA1D068 0EF676FF F64689D8
FC7EC520 EB3005C6 F846FFF8 7EC50B7F 00F67E83 7BEBF846 0104C483 0014D778
147E83E0 75F64EFF 0588F846 FFF87EC5 0030B803 EB98058A FC46FF08 74003D80
FFF87EC5 0B7DC00B F646FFF6 468B357E 00147E83 2E05C6F8 46FFF87E C5447400
F846FFF8 7EC50030 B803EB98 058AFC46 FF087400 3D80FC7E C51BEB30 05C6F846
A1121EDC 2E0C46DD 000012C8 5756CB5E 5FC99BFA 568BF846 8BC5EB14 4EFF0588

C5407500 14B3AE9A A1121EDC 2E0C46DD 000007C7 1A5EC547 720014B3 AE9A01FE
FFFC5EC5 0B74C00B 144EFF14 468BFE56 89FC4689 20568B1E 468B0000 07C7165E
160C5EDD E0D90C46 DD000107 C71A5EC5 0164E900 07C6FC5E C5EBEB30 07C6FC46
B39AA11A 36DC2EF6 46DFD8DD 0CC48300 14B4A39A 0014B3B3 9A0C46DD 50F6468D
0C46DD0C 5EDD0C7E DC02C483 0014B570 9A50FA46 8908C483 0014B413 9A0014B3
C5FA468B 0C5EDD0C 4EDCA12A 06DD2E0B EBFA46FF 05720014 B3AE9AA1 221EDC2E
89FC4689 20568B1E 468BF08B 08C48300 14B4139A 0014B3B3 9A0C46DD 0789165E
00050514 468B137C 00FA7E83 1975670A 7E831774 660A7E83 F8468914 468BFE56
830000F8 46C7057D 00F87E83 F8468940 14468B04 EB144603 FA468B08 7CFA463B
9A560788 003005C6 8BFC46FF FC5EC53C 7DF87E3B FF2B0011 F846C705 7E11F87E
0014B3B3 9A0C46DD 0C5EDDA1 2A0EDC2E EE66DC0C 46LDEE5E DD02C483 0014B3C1
563BFE56 8BFC468B 3C7C05FE 830007C6 FC5EC5BF EB47F08B 08C48300 14B4139A
D8EB3007 C6FC5EC5 1C7E0039 3D98078A 07FEFC5E C5FC4EFF 18741E46 3B057520
00CB5E5F C99B2056 8B1E468B 07FF165E C50007C6 FC5E03F8 5E8B3107 C6FC5EC5
40240000 00000000 3FF00000 00000000 400A934F 0979A371 00000000 00000000
0014A1A9 00000000 0014A19C 00000000 0014A194 0014A187 0014A17F 0014A172

00000014 A1C30000 00000014 A1B60000 00000000 00000000 00000000 000001FE
6D726F6E 6E55202D 7B007D4E 414E202B 7B007D6C 616D726F 6E6E5520 2B7B0000
69666E49 202D7B00 7D797469 6E69666E 49202B7B 007D4E41 4E202D7B 007D6C61
007D6C61 6D726F6E 6544202D 7B007D6C 616D726F 6E654420 2B7B007D 7974696E
DF9A016A EC8B5557 56CB5E5F C902C483 0F8868DF 9A006AEC 8B555756 00007525
555756CB 5E5FC902 C4830F88 68DF9A02 6AEC8B55 5756CB5E 5FC902C4 830F8868
C902C483 0F8868DF 9A046AEC 8B555756 CB5E5FC9 02C4830F 8868DF9A 036AEC8B
68DF9A06 6AEC8B55 5756CB5E 5FC902C4 830F8868 DF9A056A EC8B5557 56CB5E5F
8B555756 CB5E5FC9 02C4830F 8868DF9A 076AEC8B 555756CB 5E5FC902 C4830F88
5FC902C4 830F8868 DF9A096A EC8B5557 56CB5E5F C902C483 0F8868DF 9A086AEC
8868DF9A 0B6AEC8B 555756CB 5E5FC902 C4830F88 68DF9A0A 6AEC8B55 5756CB5E
EC8B5557 56CB5E5F C902C483 0F8868DF 9A0C6AEC 8B555756 CB5E5FC9 02C4830F
5E5FC902 C4830F88 68DF9A0E 6AEC8B55 5756CB5E 5FC902C4 830F8868 DF9A0D6A
0F8868DF 9A106AEC 8B555756 CB5E5FC9 02C4830F 8868DF9A 0F6AEC8B 555756CB
6AEC8B55 5756CB5E 5FC902C4 830F8868 DF9A116A EC8B5557 56CB5E5F C902C483
CB5E5FC9 02C4830F 8868DF9A 136AEC8B 555756CB 5E5FC902 C4830F88 68DF9A12

8868DF9A 156AEC8B 555756CB 5E5FC902 C4830F88 68DF9A14 6AEC8B55 575601FE
EC8B5557 56CB5E5F C902C483 0F8868DF 9A166AEC 8B555756 CB5E5FC9 02C4830F
5E5FC902 C4830F88 68DF9A18 6AEC8B55 5756CB5E 5FC902C4 830F8868 DF9A176A
0F8868DF 9A1A6AEC 8B555756 CB5E5FC9 02C4830F 8868DF9A 196AEC8B 555756CB
6AEC8B55 5756CB5E 5FC902C4 830F8868 DF9A1B6A EC8B5557 56CB5E5F C902C483
CB5E5FC9 02C4830F 8868DF9A 1D6AEC8B 555756CB 5E5FC902 C4830F88 68DF9A1C
830F8868 DF9A1F6A EC8B5557 56CB5E5F C902C483 0F8868DF 9A1E6AEC 8B555756
216AEC8B 555756CB 5E5FC902 C4830F88 68DF9A20 6AEC8B55 5756CB5E 5FC902C4
56CB5E5F C902C483 0F8868DF 9A226AEC 8B555756 CB5E5FC9 02C4830F 8868DF9A
C4830F88 68DF9A24 6AEC8B55 5756CB5E 5FC902C4 830F8868 DF9A236A EC8B5557
9A266AEC 8B555756 CB5E5FC9 02C4830F 8868DF9A 256AEC8B 555756CB 5E5FC902
5756CB5E 5FC902C4 830F8868 DF9A276A EC8B5557 56CB5E5F C902C483 0F8868DF
02C4830F 8868DF9A 2D6AEC8B 555756CB 5E5FC902 C4830F88 68DF9A28 6AEC8B55
DF9A2F6A EC8B5557 56CB5E5F C902C483 0F8868DF 9A2E6AEC 8B555756 CB5E5FC9
555756CB 5E5FC902 C4830F88 68DF9A30 6AEC8B55 5756CB5E 5FC902C4 830F8868
C902C483 0F8868DF 9A326AEC 8B555756 CB5E5FC9 02C4830F 8868DF9A 316AEC8B

9A346AEC 8B555756 CB5E5FC9 02C4830F 8868DF9A 336AEC8B 555756CB 5E5F01FE
5756CB5E 5FC902C4 830F8868 DF9A356A EC8B5557 56CB5E5F C902C483 0F8868DF
02C4830F 8868DF9A 376AEC8B 555756CB 5E5FC902 C4830F88 68DF9A36 6AEC8B55
DF9A396A EC8B5557 56CB5E5F C902C483 0F8868DF 9A386AEC 8B555756 CB5E5FC9
555756CB 5E5FC902 C4830F88 68DF9A3A 6AEC8B55 5756CB5E 5FC902C4 830F8868
C902C483 0F8868DF 9A3C6AEC 8B555756 CB5E5FC9 02C4830F 8868DF9A 3B6AEC8B
68DF9A3E 6AEC8B55 5756CB5E 5FC902C4 830F8868 DF9A3D6A EC8B5557 56CB5E5F
8B555756 CB5E5FC9 02C4830F 8868DF9A 3F6AEC8B 555756CB 5E5FC902 C4830F88
1476FF00 0005C712 7EC50005 08C85756 00CB5E5F C902C483 0F8868DF 9A406AEC
010CE903 74003D83 127EC50C C4830014 AA7F9A0A 76FF0C76 FF50FF00 868D1657
0589127E C50AC483 0014C930 9A0A76FF 0C76FF50 5299006A FEFE8689 FF3A868B
16016A50 0A76FF0C 76FFFEFC 868902E0 C1FF3CAE F7FF3C86 8B00E5E9 0374C00B
FF1076FF 575600B2 E9037400 3D830589 127EC50C C4830014 C82A9A50 FAF8868D
0014D6BE 9A0E76FF 1076FF50 FF12868D 16146A5E 5F003400 029A6E6A 006A0E76
0C868B0A C4830014 D6BE9A50 0014050E 468B1076 FF50FF26 868D1614 6A0AC483
04FEFABE 830000FE FA86C72C 4589FF10 868B2A45 89FF0E86 8B284589 0E7EC5FF

0302E7C1 FEF8BE03 04E7C1FE FABE8B37 7D04FEF8 BE830000 FEF886C7 4A7D01FE
D99BFE03 105E8E0E 7E0304E7 C1FEFABE 8B02E6C1 FEF8B68B FAF885D9 9B1F16FD
000005C7 127EC500 0508C857 56CB5E5F C99BAFEB FEFA86FF C2EBFEF8 86FF2E5D
0374003D 83127EC5 0CC48300 14AA7F9A 0A76FF0C 76FF50FF 00868D16 571476FF
468B1076 FF146A0A C4830014 D6BE9A50 FF12868D 160E76FF 1076FF14 6A0111E9
2A458BFF 0C868928 458B0E7E C50AC483 0014D6BE 9A50FF26 868D1650 0014050E
BE830000 FEF886C7 4A7D04FE FABE8300 00FEFA86 C7FF1086 892C458B FF0E8689
8B2E45D9 9BFE0310 5E8E0E7E 0304E7C1 FEFABE8B 02E6C1FE F8B68B37 7D04FEF8
FEFA86FF C2EBFEF8 86FFFAF8 9DD99B1F 16FD0302 E7C1FEF8 BE0304E7 C1FEFABE
127EC50A C4830014 C9309A0A 76FF0C76 FF505299 006AFEFE 8689FF3A 868BAFEB
8D16016A 500A76FF 0C76FFFE FC868902 E0C1FF3C AEF7FF3C 868B4E75 C00B0589
571476FF 0010FF3C 86C71E75 003D8305 89127EC5 0CC48300 14C8AD9A 50FAF886
C5000508 C85756CB 5E5FC99B 0CC48300 14AA349A 0A76FF0C 76FF50FF 00868D16
50FF0086 8D161276 FF1476FF 04C48300 14A9B79A 50FF0086 8D160000 05C7127E
830000FE FA86C700 8FE90374 003D8312 7EC50CC4 830014AA 349A0A76 FF0C76FF
E7C1FEF8 BE0304E7 C1FEFABE 8B207D10 FEF8BE83 0000FEF8 86C7337D 10FEFABE

89FF3A86 8BC6EBFE FA86FFD9 EBFEF886 FFFAF89D D99BEED9 9B1F16FD 030201FE
8B2B75C0 0B058912 7EC50AC4 830014C9 309A0A76 FF0C76FF 50529900 6AFEFE86
C8AD9A50 FAF8868D 16016A50 0A76FF0C 76FFFEFC 868902E0 C1FF3CAE F7FF3C86
00010245 C7010005 C70A7EC5 EC8B5557 56CB5E5F C99B0589 127EC50C C4830014
45C70000 0E45C700 000C45C7 00000A45 C7000008 45C70200 0645C700 050445C7
8B0C76FF 57565E5F 00340002 9A146A00 6A500012 050A468B 0C76FF57 56000010
45C70010 3C45C73A 4589058B 0A7EC55E 5F003400 029A146A 006A5000 26050A46
76FF006A 006A006A 000005C7 127EC5EC 8B555756 CB5E5FC9 00004045 C700003E
016A0100 680A76FF 0C76FF1E 75C00B05 89127EC5 0AC48300 14C9309A 0A76FF0C
C7127EC5 EC8B5557 56CB5E5F C9058912 7EC50CC4 830014C8 AD9A0E76 FF1076FF
1E75C00B 0589127E C50AC483 0014C930 9A0A76FF 0C76FF00 6A006A00 6A000005
5FC90589 127EC50C C4830014 C82A9A0E 76FF1076 FF016A01 00680A76 FF0C76FF
E046C608 DF46C601 DE46C600 0FDC46C7 04DB46C6 00DA46C6 000026C8 5756CB5E
8908C483 0014B449 9A0014B3 B39A0CD8 269B05D9 9B167EC5 0E76C400 E146C600
499A0014 B3B39A0C D8269B05 D99B1A7E C51276C4 0589AEB4 3EC52EE8 5689E646
127EC5F2 5EDD9B05 D99B0E7E C50589AE B83EC52E E45689E2 468908C4 830014B4

830014AF 089A0A76 FF0C76FF 50DA468D 162676FF 2876FFEA 5EDD9B05 D99B01FE
89140326 AEBC3EF7 2E99058B AEB43EC5 2EAEB436 C42E6F75 003D8326 7EC50CC4
FF2EAEC4 36FF2E26 76FF2876 FF025589 0589AEBE 3EC52E99 C68B02E6 C1358B15
C71A7500 3D83267E C512C483 0014B0BD 9A0A76FF 0C76FF01 6A006A00 6AAEC236
5756CB5E 5FC99B0A C4830014 ABE49AFA 76FF2276 FF2476FF 572876FF 0000FA46
FF2E50E4 2A058AAE D63EC52E 1076FF12 76FFFE56 89FC4689 990A468B 000004C8
C836FF2E AECA36FF 2EAECC36 FF2EAECE 36FF2EAE D036FF2E AED236FF 2EAED436
C52EAEBE 36C42E65 75003D83 107EC518 C4830014 ACA89A0A 76FFAEC6 36FF2EAE
7EC50255 8B058BAE CE3EC52E 3073043B 26357707 7202543B 26D22B05 8BAECA3E
83001467 D49AFC76 FFFE76FF 1076FF12 76FF0105 C6AED63E C52E0255 8905890C
5FC90005 C6AED63E C52E0255 8905890C 7EC50255 8B058BAE C63EC52E 1AEB08C4
76FF1375 050B0245 8BAEDA3E C52EFE46 89058BAE BE3EC52E 000008C8 5756CB5E
FF0C7EC5 575600E4 E9037401 1C7E8302 55890589 147EC502 C4830014 D36C9AFE
8BD22B05 8B107EC5 5E5F002C 00029A35 FF107EC5 35FF0275 FF147EC5 35FF0275
DE36C52E FA468905 8B187EC5 FC4689D1 1BC32B02 558B058B AEBE3EC5 2ECA8BD8
2EFE4689 D11BC32B 02558B05 8BAEBE3E C52ECA8B D88BD22B C78B47F8 2B3C8BAE

FF2E571A 76FF56AE E036FF2E 1E76FF20 76FF0589 187EC540 058BAEDE 3EC501FE
003D831E 7EC514C4 830014B0 F69A35FF 0275FFAE C23EC52E AEDA36FF 2EAEDC36
107EC514 76C45052 02548B26 04032605 8B187EC5 AEDA36C4 2E575600 F1E90374
0589187E C5FFFF05 FE468B5E 5F002C00 029AFC76 FF505202 548B2604 0326058B
AEDA36FF 2EAEDC36 FF2E1876 FF1A76FF AEDE36FF 2EAEE036 FF2E1E76 FF2076FF
C5AEDA36 C42E7C75 003D831E 7EC514C4 830014B0 E39A35FF 0275FFAE C23EC52E
042B2605 8BAEDE3E C52E1876 C4025589 05890C7E C502548B 26040326 058B187E
187EC5AE BE36C42E FA5689F8 4689D22B C78B473C 8BAEDE36 C52E0589 107EC540
8B187EC5 AEBE36C4 2E1577F8 463B1A77 0772FA56 3B025413 26040326 D22B058B
000002C8 5756CB5E 5FC90589 187EC505 8B187EC5 05EB0254 13260403 26D22B05
0014B109 9A35FF02 75FFAEC2 3EC52EAE D236FF2E AED436FF 2E006A50 FE468D16
1482001C 148A0002 001C1486 001C1488 CB5E5FC9 FE468B03 7400FE7E 830EC483
5756001C 149A001C 147E001C 147C001C 148E001C 1494001C 1498001C 1490001C
02C4830F 9868DF9A 016AEC8B 555756CB 5E5FC902 C4830F98 68DF9A00 6AEC8B55
DF9A036A EC8B5557 56CB5E5F C902C483 0F9868DF 9A026AEC 8B555756 CB5E5FC9
555756CB 5E5FC902 C4830F98 68DF9A04 6AEC8B55 5756CB5E 5FC902C4 830F9868

C4830F98 68DF9A06 6AEC8B55 5756CB5E 5FC902C4 830F9868 DF9A056A EC8B01FE
9A086AEC 8B555756 CB5E5FC9 02C4830F 9868DF9A 076AEC8B 555756CB 5E5FC902
5756CB5E 5FC902C4 830F9868 DF9A096A EC8B5557 56CB5E5F C902C483 0F9868DF
02C4830F 9868DF9A 0B6AEC8B 555756CB 5E5FC902 C4830F98 68DF9A0A 6AEC8B55
DF9A0D6A EC8B5557 56CB5E5F C902C483 0F9868DF 9A0C6AEC 8B555756 CB5E5FC9
555756CB 5E5FC902 C4830F98 68DF9A0E 6AEC8B55 5756CB5E 5FC902C4 830F9868
C902C483 0F9868DF 9A106AEC 8B555756 CB5E5FC9 02C4830F 9868DF9A 0F6AEC8B
68DF9A12 6AEC8B55 5756CB5E 5FC902C4 830F9868 DF9A116A EC8B5557 56CB5E5F
8B555756 CB5E5FC9 02C4830F 9868DF9A 136AEC8B 555756CB 5E5FC902 C4830F98
5FC902C4 830F9868 DF9A156A EC8B5557 56CB5E5F C902C483 0F9868DF 9A146AEC
9868DF9A 176AEC8B 555756CB 5E5FC902 C4830F98 68DF9A16 6AEC8B55 5756CB5E
EC8B5557 56CB5E5F C902C483 0F9868DF 9A186AEC 8B555756 CB5E5FC9 02C4830F
5E5FC902 C4830F98 68DF9A1A 6AEC8B55 5756CB5E 5FC902C4 830F9868 DF9A196A
0F9868DF 9A1C6AEC 8B555756 CB5E5FC9 02C4830F 9868DF9A 1B6AEC8B 555756CB
6AEC8B55 5756CB5E 5FC902C4 830F9868 DF9A1D6A EC8B5557 56CB5E5F C902C483
CB5E5FC9 02C4830F 9868DF9A 1F6AEC8B 555756CB 5E5FC902 C4830F98 68DF9A1E

9868DF9A 216AEC8B 555756CB 5E5FC902 C4830F98 68DF9A20 6AEC8B55 575601FE
EC8B5557 56CB5E5F C902C483 0F9868DF 9A226AEC 8B555756 CB5E5FC9 02C4830F
5E5FC902 C4830F98 68DF9A24 6AEC8B55 5756CB5E 5FC902C4 830F9868 DF9A236A
0F9868DF 9A266AEC 8B555756 CB5E5FC9 02C4830F 9868DF9A 256AEC8B 555756CB
6AEC8B55 5756CB5E 5FC902C4 830F9868 DF9A276A EC8B5557 56CB5E5F C902C483
CB5E5FC9 02C4830F 9868DF9A 296AEC8B 555756CB 5E5FC902 C4830F98 68DF9A28
830F9868 DF9A2B6A EC8B5557 56CB5E5F C902C483 0F9868DF 9A2A6AEC 8B555756
2D6AEC8B 555756CB 5E5FC902 C4830F98 68DF9A2C 6AEC8B55 5756CB5E 5FC902C4
56CB5E5F C902C483 0F9868DF 9A2E6AEC 8B555756 CB5E5FC9 02C4830F 9868DF9A
C4830F98 68DF9A30 6AEC8B55 5756CB5E 5FC902C4 830F9868 DF9A2F6A EC8B5557
9A326AEC 8B555756 CB5E5FC9 02C4830F 9868DF9A 316AEC8B 555756CB 5E5FC902
5756CB5E 5FC902C4 830F9868 DF9A336A EC8B5557 56CB5E5F C902C483 0F9868DF
02C4830F 9868DF9A 356AEC8B 555756CB 5E5FC902 C4830F98 68DF9A34 6AEC8B55
0BF8681E 0C7436FF 1E57770D 1F0C743E 815F731D 0BFA3E83 FFFEE481 CB5E5FC9
8D0D8A0B FE9F8C0B FCBF890C 743E8BDB 03DB030B FA1E8B0D 70068600 1498469A
39AAC02A F2E2AA20 0402775A 3C067241 3CAC0EE3 ED2AAA01 74203CFC 071E0175

87C70000 0BFC87C7 DB03DB03 0BFA1E8B 9A750D0D 703E800B FA06FF0C 743E01FE
C4830014 C2D49A0B FA681E0B FC681E1E D88E001C B80014D2 B89AED2B 00000BFE
6A02C483 0014D61A 9A500AC4 8300143D 049A0BFA 36FF0BFC 681E006A 006A1F08
521FDD36 DC8B08EC 835A58CB 9EE0DF9B E4D90002 07FF0FBF 00F40014 98269A01
55CBC9FC 46DB0000 FE46C7FC 46890646 8B000004 C8CB5D06 46DFEC8B 55CB9B50
00FE46C7 0000FC46 C7FA4689 08468BF8 46890646 8B000008 C8CB5D06 46DBEC8B
2ED92EFE 7ED99B00 0004C8CB C9FC46D9 FC5ED906 46DD0000 04C8CBC9 F86EDF00
0646DDB3 A62ED92E FE7ED99B 000006C8 CBC9FC46 8BFE6ED9 FC5EDF06 46DDB3A6
6ED9FA5E DB0646DD B3A62ED9 2EFE7ED9 9B000006 C8CBC9FA 468BFE6E D9FA5EDB
8BFE6ED9 F67EDF06 46DDB3A6 2ED92EFE 7ED99B00 000AC8CB C9FC568B FA468BFE
D90646DD 0E46DFEC 8B55CBC9 FC46D9FC 5ED90646 DD000004 C8CBC9F8 568BF646
D9C2DEE8 D9F9DEB3 AA06DF2E 0B740014 B3AC9AF4 D90646DD EC8B55CB 5DD9DDFD
E9DCFCD9 C0D90646 DDB3A82E D92EFE7E D99B0000 02C8CB5D 9B1FDF26 0E5EC4C9
8BA4F3FC 0A7EC40E 76C509E3 124E8BEC 8B555756 00CBC9FE 6ED91FDD 260E5EC4
0BEB085F C436DC8B C38B0098 E9B51EB8 0095E9B5 1EB800CB 5E5FC90C 568B0A46
F7260A46 8BF88BF2 8B27F726 0A468B50 EC8B5557 56085F8D DC8BC38B C08ED08C

E5D90646 DDEC8B55 00CB5E5F C95BC78B D68BF003 27F7260C 468BF003 026701FE
8BE8D9D8 8E001CB8 EC8B551E CB5D000F 25080C02 7440A847 24C48AD8 DDE0DF9B
5D14D83E DE0474C0 0BD8DDFC E2C9DC14 DA06DF40 D9F70379 C90BC02B 1BE3084E
2B530EFA 8BD88B53 EC8B5557 568000BA 03EB8001 BA08EBD2 2B0CEB00 01BACB1F
83D8F7DA F70C79D2 0B0E468B 10568B06 EB078B26 02578B26 0E5EC40C 79FF0BF6
FA5EFF50 524600DA 83D8F7DA F70879D2 0B0A468B 0C568B50 52460172 EFD100DA
D08C0BEB 085FC436 DC8BC38B 00CB5E5F C95B00DA 83D8F7DA F70773EE D10CC483
D2D1E0D1 0020B9FF 2BF62B0A 468B0C56 8B50EC8B 55575608 5F8DDC8B C38BC08E
CB5E5FC9 5BE1E240 02771B26 3F2B2608 723F3B26 05770F72 02773B26 D6D1D7D1
7E8B0C76 8B50EC8B 55575608 5F8DDC8B C38BC08E D08C0BEB 085FC436 DC8BC38B
072B2607 72073B26 05770E72 02573B26 D2D1D0D1 D6D1E7D1 0020B9C0 2BD22B0A
89FC4689 BA2A168B 2EBA2806 8B2E0000 04C85756 00CB5E5F C95BE2E2 02571B26
12FC4683 0674003D 83FC7EC5 0E76FC46 3B016805 BA2A168B 2EBA2806 8B2EFE56
FF1AEBD0 8BC02B06 75FC463B 0B75FE56 3B016805 BA2A168B 2EBA2806 8B2EE0EB
C85756CB 5E5FC90C C4830014 B7199A0A 76FF0C76 FF0E76FF 1076FFFC 76FFFE76
F62B01C9 E90374C0 0B04C483 0014B972 9A531476 FF137400 3F83125E C5000108

01CE8106 7572FA7E 832F74C0 0BFA4689 98078A0E 46FF0E5E C50000FE 46C701FE
7562FA7E 83CCEB00 04CE8106 7561FA7E 83D8EB00 02CE8106 7577FA7E 83E4EB00
C4830014 D4149A50 FEFA868D 160A76FF 0C76FF01 7CE90375 F60BC1EB FE46FFC6
8D165756 247402FE 832975C0 0B08C483 0014B9DC 9A0A76FF 0C76FFBA 2C680E08
187504FE 831D7521 FEF8BE83 FC46895E 5F001498 A69A50FE F8868D16 50FEFA86
E9037500 FEF8BE83 FC46895E 5F001499 469A50FE F8868D16 50FEFA86 8D165756
00149966 9A50FEF8 868D1600 6A006A04 6AFC76FF 57561875 04FE8301 04E900BF
00000247 C70C5789 0A478908 47890647 89D08BC0 2B0E4789 125EC5FC 468B5E5F
830A7402 FE830004 0F81125E C5077503 FE830574 01FE8300 0007C7FF FF0447C7
33680E00 080F8112 5EC50774 00FE7E83 00030F81 125EC507 7504FE83 057403FE
BA38680E 1DEB0200 0F81125E C50974C0 0B08C483 0014B9DC 9A0A76FF 0C76FFBA
EB14568B 12468B04 000F8112 5EC50774 C00B08C4 830014B9 DC9A0A76 FF0C76FF
006A57FC 76FF5756 0002BF03 EB0003BF 057503FE 830DEB00 01BF0575 01FE834C
F8868D16 FC76FF57 56FF0EE9 037500FE F8BE835E 5F001498 869A50FE F8868D16
52740001 05F70A7E C5000002 C85756CB 5E5FC9D0 8BC02B5E 5F001498 E69A50FE
560A75FF 0C75FF0E 75FF5756 3E74C00B F08B0245 2B0080B8 4A740A45 0B0C458B

16EBFFFF B800200D 810A7EC5 0C7400FE 7E835E5F 00149866 9A50FE46 8D1601FE
000002C8 5756CB5E 5FC9C02B 00800245 C7085589 0645890C 558B0A45 8B0A7EC5
96C69A50 FE468D16 0E75FF0A 7EC55756 F08B04C4 830014B9 0B9A0A76 FF0C76FF
450B0C45 8B0A7EC5 5E5F0014 98E69A50 FE468D16 0E75FF0A 7EC55756 5E5F0014
C68B0000 05C70A7E C504C483 0014D3F9 9A0A75FF 0C75FF0E 75001005 F714740A
EE83037F 7AFE8308 7C00613D F08B9807 8A0A46FF 0A5EC5EC 8B555756 CB5E5FC9
75F60B04 75FE3B20 EF83037F 7AFF8308 7C00613D F88B9807 8A0E46FF 0E5EC520
003A6963 3A003A6B 726F773A 001C0EDE CB5E5FC9 C02B02EB 0001B805 75FE3BC8
0C76FF08 C4830014 81B89A0A 76FF0C76 FFBBC468 0EEC8B55 57560000 3A6F633A
B89A0A76 FF0C76FF BBC9680E EC8B5557 56CB5E5F C904C483 0014B90B 9A0A76FF
0E468BEC 8B555756 CB5E5FC9 04C48300 14B90B9A 0A76FF0C 76FF08C4 83001481
0EBB11BB 0BBB05BA FFBAF9BA F3BAEDBA D9BAA7A7 FF2ED88B E0D17977 00073D48
EB04C483 0014B90B 9A0A76FF 0C76FF08 C4830014 81B89A0A 76FF0C76 FFBC4E68
EBBBEE68 0EEAEBBB DE680ECA EB08C483 001481B8 9A0A76FF 0C76FFBB CE680E41
B8C6EBBC 3E680ECC EBBC2E68 0ED2EBBC 1E680ED8 EBBC0E68 0EDEEBBB FE680EE4
FF1676FF 06C48300 14BA909A 0A76FF0C 76FF0E76 FFEC8B55 5756CB5E 5FC9FFFF

9A1076FF 1276FF50 04C48300 14D7789A 1476FF16 76FF1076 FF1276FF 147601FE
66680E16 C4830014 81B89A0A 76FF0C76 FFBC5368 0E0E76FF 5004C483 0014D778
5E5FC904 C4830014 B90B9A0A 76FF0C76 FF08C483 001481B8 9A0A76FF 0C76FFBC
14BA909A 0A76FF0C 76FF5098 FF468A18 7F08FF7E 8001FF46 C6000002 C85756CB
316B3161 3066261B 00406A26 1B00426A 261B00CB 5E5FC9E2 EBFF46FE 06C48300
316B3361 3066261B 00514F1B 204C3364 316B3261 3066261B 00504F1B 204C3364
316B3561 3066261B 00534F1B 204C3364 316B3461 3066261B 00524F1B 204C3364
316B3761 3066261B 00554F1B 204C3364 316B3661 3066261B 00544F1B 204C3364
66261B00 426A261B 00574F1B 204C3364 316B3861 3066261B 00564F1B 204C3364
036A5756 00000AC8 57560000 426A261B 00732573 254C6425 6464256B 64256130
8D16FF6A BE9436FF 2EBE9636 FF2E5057 56FC4689 5E5F0014 9B6C9A50 FA468D16
480A468B F85689F6 468902C4 830014D7 E69A50FE 46895E5F 00149BCC 9A50FA46
46BD39BD 2CBD1FBD 11BD04BC F6BCDEBC C7A7FF2E D88BE0D1 00A2E903 7600083D
E3EB0AC4 830014B4 EA9A0C76 FF0E76FF F676FFF8 76FF246A 0085E9C0 2BBD53BD
76FF043E 68F0EB00 2E05F646 8BF876FF 106AE2EB 50002405 F6468BF8 76FF0A6A
7E05F646 8BF876FF 046AD5EB 047C05F6 468BF876 FF026AE2 EB003E05 F6468BF8

6AAEEB04 8A05F646 8BF876FF 026ABBEB 048205F6 468BF876 FF086AC8 EB0401FE
468D1603 6A575600 000AC857 56CB5E5F C90001B8 A1EB048C 05F6468B F876FF02
50FA468D 16FF6ABE 9436FF2E BE9636FF 2E505756 FC46895E 5F00149B 6C9A50FA
00083D48 0A468BF8 5689F646 8902C483 0014D7E6 9A50FE46 895E5F00 149BCC9A
BE78BE65 BE52BE3F BE2CBE18 BE05BDF1 BDD9BDC2 A7FF2ED8 8BE0D100 D3E90376
FF0A6AE3 EB0AC483 0014B4EA 9AF676FF F876FF0C 76FF0E76 FF246A00 B6E9C02B
05F6468B F876FF0C 76FF0E76 FF106AE2 EB500024 05F6468B F876FF0C 76FF0E76
0C76FF0E 76FF026A D6EB003E 05F6468B F876FF0C 76FF0E76 FF043E68 EAEB002E
086AB0EB 047E05F6 468BF876 FF0C76FF 0E76FF04 6AC3EB04 7C05F646 8BF876FF
05F6468B F876FF0C 76FF0E76 FF026A9D EB048205 F6468BF8 76FF0C76 FF0E76FF
00CB5E5F C90001B8 FF76E904 8C05F646 8BF876FF 0C76FF0E 76FF026A 8AEB048A
C4830014 D3B79A01 6A500090 05FC4689 0E6EF710 468B0000 0AC85756 001C14B0
067400FA 7E83FE46 895E5F00 149A0C9A 50FA468D 16006A57 56F85689 F6468904
9A50FA46 8D16FE76 FFFC76FF F676FFF8 76FF0E75 FF127EC5 57560088 E9FA468B
FE9A50FA 468D16FF 6AFE76FF 0E75FF12 7EC55756 D47500FA 7E835E5F 0014D228
00FA7E83 5E5F0014 99EC9A50 FA468D16 FE76FF57 56B57500 FA7E835E 5F0014D1

5E5F002C 00029AFC 76FF5000 9005F646 8BF876FF 0A76FF0C 76FF5756 9E7501FE
0E6EF710 468B0000 0AC85756 CB5E5FC9 C02B04C4 830014D3 F99AF676 FFF876FF
E9F6468B 067400F6 7E83FE46 895E5F00 149A0C9A 50F6468D 16006A57 56FC4689
50009005 525756FA 5689F846 8904C483 0014D3B7 9A016A50 009005FC 468B009D
76FFF876 FFFA76FF 0E75FF12 7EC55756 5E5F002C 00029AFC 76FF0A76 FF0C76FF
76FF0E75 FF127EC5 5756A675 00F67E83 5E5F0014 D2889A50 F6468D16 FE76FFFC
9A50F646 8D16FE76 FF575687 7500F67E 835E5F00 14D1FE9A 50F6468D 16FF6AFE
C9C02B04 C4830014 D3F99AF8 76FFFA76 FFFF6DE9 037400F6 7E835E5F 001499EC
00FE7E83 FC46895E 5F00149A 0C9A50FE 468D1600 6A575600 0004C857 56CB5E5F
8D16FC76 FF0E76FF 1076FF50 40401246 8B0E75FF 0A7EC557 5661EBFE 468B0574
468D16FF 6AFC76FF 0E75FF0A 7EC55756 D27500FE 7E835E5F 0014D258 9A50FE46
5E5F0014 99EC9A50 FE468D16 FC76FF57 56B37500 FE7E835E 5F0014D1 FE9A50FE
000A7E83 0000F046 C7FFFFF2 46C70000 1CC85756 CB5E5FC9 C02B9C75 00FE7E83
FF2E5057 56F64689 5E5F0014 9B6C9A50 F4468D16 036A5756 01F1E9FF FFB80675
8D16F076 FF5756E8 46895E5F 00149BCC 9A50F446 8D16FF6A C2D036FF 2EC2D236
1600A068 575605EB 00C06857 5607750B 0C7E83E6 46895E5F 00149A0C 9A50F446

8BFE5689 FC468902 C4830014 D7E69A50 FA46895E 5F00149A 8C9A50F4 468D01FE
561B75FE 0A7E833B 74000E7E 83034588 0E468B02 45880C46 8B0589FC 7EC50A46
FF1276FF 646A1AEB 5E5F002C 00029A04 6A1076FF 1276FF50 000405FC 468B5257
FF1676FF 146A6875 0B0C7E83 0AC48300 14D6BE9A 50000405 FC468BFE 76FF1076
8BFE76FF 1876FF1A 76FF146A 0AC48300 14D6BE9A 50006805 FC468BFE 76FF1476
50009005 FC468BFE 76FF1C76 FF1E76FF 146A0AC4 830014D6 BE9A5000 7C05FC46
830014D6 BE9A5000 A405FC46 8BFE76FF 2076FF22 76FF146A 0AC48300 14D6BE9A
76FFE676 FF57565E 5F00149B AC9A50F4 468D16E6 76FFFA76 FFE876FF 57560AC4
468902C4 830014D7 E69A50F8 46895E5F 00149B8C 9A50F446 8D1650EE 468D16F2
FF57565E 5F001499 EC9A50F4 468D16E6 76FF5756 E5468805 8BEA7EC5 EC5689EA
C7C28FA7 FF2ED88B E0D14177 00053D0C 468B5E5F 00149A2C 9A50F446 8D16FA76
C2C7C2AE A7FF2ED8 8BE0D122 7700033D 4898E546 8AC29BC2 9BC2C7C2 9BC29BC2
00CB5E5F C998E546 8A02C483 0014D802 9A171968 0B74010C 7E83C2BC C2BCC2B6
0375C20B FA5689F8 46890255 8B058B0E 7EC5040E 46830000 18C85756 001C14D4
7EC5EE56 89EC4689 10568B0E 468B0000 F046C700 00FE46C7 0000FC46 C701A4E9
8BEC7EC5 04EC4683 B275003D 80F87E8B F846FF2D 7500233D 98F34688 98058AF8

3CF37E80 F046FFF3 46889805 8AF87EC5 9C74C20B FA5689F8 46890255 8B0501FE
68EBC4A2 B8057500 F07E83F8 46FFFE56 89FC4689 C49E168B 2EC49C06 8B2E2375
46FFFE56 89FC4689 001205C4 9E168B2E C49C068B 2E65753E F37E8063 EBC4A4B8
C51B74C2 0BFA5689 F8468902 558B058B EC7EC504 EC468331 75003D80 F87EC5F8
057500F0 7E830EEB C4A9B813 EBC4A7B8 057500F0 7E83F846 FF13753E 3D80F87E
76FFFE76 FFFEF1E9 0375FC46 0BFE468B F65689F4 46895A0E C4AEB803 EBC4ACB8
8BF876FF FA76FF48 75C20B0C C4830014 B7199AF8 76FFFA76 FFF476FF F676FFFC
B1680EC4 CF680E04 EBC4CA68 0E0675C4 9C063B2E 0D75C49E 163B2EFE 568BFC46
C4830014 D61A9A01 6A10C483 001481B8 9A500024 05C49C06 8B2EC49E 36FF2EC4
0A7EC5C4 A03EF72E 990E462B EC468BEA 5689E846 89040E6E 8310568B 0E468B02
4683E87E C502558B 058BEC7E 8B04EC46 83FE5DE9 0375050B 02458BEC 7EC50529
00770062 61006100 62720072 0004001C 0EDE00CB 5E5FC9D9 EB025589 058904E8
6D6F7266 000A2273 25222073 25207463 65726964 65722074 6F6E6E61 63006277
FB874EA4 164E8BC0 8C0A7EC4 C28CDF8B 127EC40E 76C5FCEC 8B555756 006F7400
0E76C512 4E8BEC8B 555756CB 5E5F5DEB E2C08EFB 87479600 D4800502 2696C28E
0C00FA46 C70000FE 46C71EEC 83EC8B55 575600CB 5E5F5DFA E2AAFCAC FD0A7EC4

FC0000F4 46C7C92B D2F70455 8B26F246 8906452B 260010B8 35C5260A 7EC401FE
D3F7DA8B 49740000 3DAD087D C4269057 EB037400 187D8026 FD017400 197D8026
B8D7E29D ABC38BF4 4689ABFC 9C0C74F4 463BF24E 87E6D3F2 4E87C223 F274D823
26B7E29D ABC38BAB FC9CFC45 8B26D82B FFFFFE45 C7261573 C33BFE45 2B26FFFF
003DAD08 7DC42600 00F646C7 0000FC46 C71445D9 26E3DB9B 907CEBB1 EBFE5D01
01DE74F6 5E2BF85E 8B9BF85E DBC9D8FC 46DBFC5E 01F274D8 23D3F7DA 8B607400
FFFFB8C0 E29DABC3 8BF44689 ABFC9C0C 74F4463B F24E87E8 D3F24E87 C223F65E
5D0126A0 E29DABC3 8BABFC9C FC458B26 D82BFFFF FE45C726 1573C33B FE452B26
C4FCEC8B 555756CB 5E5F5DE5 8B0000B8 0C4C89E1 D1087CC4 0A76C5D9 F79AEBFE
26065D8E 26047503 26F103E1 D10C4D8B 26F08BE0 D10A65F7 26480845 8B260A7E
900DEB03 755E5FA7 F3CB8B57 5648F903 3DC426E2 D10A558B 260E5D8B 2608458B
006005F7 0C7EC50A 768B0000 02C85756 CB5E5FC9 FFFFB8E9 EB027400 003DF22C
FF0E76FF 26740400 05F72C75 09FE834B 75000805 F70C7EC5 016DE9FF FFB80674
E90009B8 E0750007 05F7C826 3EC52ED1 74FFFF3D 06C48300 14C69C9A 206A0C76
F70C7EC5 A674FFFF 3D06C483 0014C69C 9A0D6A0C 76FF0E76 FF15750A FE830133
D22B0245 8B016A0E 75FF0C7E C5575691 EB00200D 81067500 0205F74C 75000105

458B0C7E C5D2EB0C 7EC50574 00FE7E83 5E5F0014 99669A50 FE468D16 505201FE
80682675 0A450B0C 458B0C7E C500010D 81008002 45C70855 89064589 0C558B0A
C7085589 0645890A 458B9774 C20B0C55 890A4589 0C7EC502 C4830014 D36C9A00
FF04E903 74C00B04 C4830014 B90B9A57 0E76FF13 7500027D 830C7EC5 00800245
05F75175 000805F7 0C7EC505 88C68B06 47FF2606 7FC5260C 5EC4024D FF0C7EC5
0EEB0DFF C8263EC5 2E097508 FE831CEB 05FFC826 3EC52E09 7C20FE83 2A740400
570E76FF 13740400 05F70C7E C51C750A FE830000 05C7C826 3EC52E09 750DFE83
001C14DE 00CB5E5F C9C68BF0 8BE42AC6 8BFE95E9 0374C00B 04C48300 14B90B9A
895E5F00 149A0C9A 50FA468D 16006A57 56FC4689 0E6EF710 468B0000 06C85756
9A50FA46 8D1650FC 76FF0A76 FF0C76FF 0E75FF12 7EC55756 547500FA 7E83FE46
8C9A50FA 468D16FF 6AFE76FF 0E75FF12 7EC55756 307500FA 7E835E5F 00149C6C
C9FA468B 5E5F0014 99EC9A50 FA468D16 FE76FF57 56117500 FA7E835E 5F00149C
00149A0C 9A50FA46 8D16006A 5756FC46 890E6EF7 10468B00 0006C857 56CB5E5F
468D1650 FC76FF0A 76FF0C76 FF0E75FF 127EC557 56547500 FA7E83FE 46895E5F
FA468D16 FF6AFE76 FF0E75FF 127EC557 56307500 FA7E835E 5F00149C CC9A50FA
8B5E5F00 1499EC9A 50FA468D 16FE76FF 57561175 00FA7E83 5E5F0014 9C8C9A50

46895E5F 00149A0C 9A50FE46 8D16006A 57560000 04C85756 CB5E5FC9 FA4601FE
8D16FC76 FF0E76FF 1076FF50 40401246 8B0E75FF 0A7EC557 56597500 FE7E83FC
468D16FF 6AFC76FF 0E75FF0A 7EC55756 307500FE 7E835E5F 00149CAC 9A50FE46
5E5F0014 99EC9A50 FE468D16 FC76FF57 56117500 FE7E835E 5F00149C 8C9A50FE
750014B3 AE9ACB00 1EDC2E0A 46DDFF2B F62B0000 0AC85756 00CB5E5F C9FE468B
8D160115 E9EED900 2107C7CB 081EC52E 09770014 B3AE9ACB 001EDC2E 1246DD1D
AE9ACB00 1EDC2E0A 46DDF85E DD0CC483 0014B4C8 9A0014B3 B39A1246 DD50F846
9A1246DD 0A5EDDE0 D90A46DD BC750014 B3AE9ACB 001EDC2E F846DD32 730014B3
9ACB001E DC2E1246 DD0001BE 03740001 C1F7C88B 08C48300 14B4139A 0014B3B3
0F750014 B3AE9ACB 001EDC2E F846DD00 01BF125E DDE0D912 46DD0B73 0014B3AE
DC08C483 0014CDCA 9A0014B3 B39A0A46 DD2A7600 14B3AE9A CB0C1EDC 2E1246DD
5EDDCB1C 06DD2E3F EBF85EDD 08C48300 14CC8A9A 0014B3B3 9ACB140E DC2E124E
740001F6 46F71E74 00F67E83 F6468908 C4830014 B42E9A00 14B3B39A 1246DDF8
76DCE8D9 0874FF0B DCEBF66E D10A5EDD 0A4EDC0A 46DDF85E DDF84EDC 0A46DD09
00000000 00000000 CB5E5FC9 9BF846DD F85EDDE0 D9F846DD 0874F60B F85EDDF8
8B555756 3FF00000 00000000 400A934F 0979A371 40D00000 00000000 001C14DC

14D70A9A 0A6A016A EC8B5557 56CB5E5F C904C483 0014D70A 9A096A00 6AEC01FE
555756CB 5E5FC904 C4830014 D70A9A0C 6A026AEC 8B555756 CB5E5FC9 04C48300
0014D70A 9A066A04 6AEC8B55 5756CB5E 5FC904C4 830014D7 0A9A0A6A 036AEC8B
8B555756 CB5E5FC9 04C48300 14D70A9A 086A056A EC8B5557 56CB5E5F C904C483
830014D7 0A9A0E6A 076AEC8B 555756CB 5E5FC904 C4830014 D70A9A0A 6A066AEC
EC8B5557 56CB5E5F C904C483 0014D70A 9A0A6A08 6AEC8B55 5756CB5E 5FC904C4
C4830014 D70A9A05 6A0A6AEC 8B555756 CB5E5FC9 04C48300 14D70A9A 046A096A
6AEC8B55 5756CB5E 5FC904C4 830014D7 0A9A096A 0B6AEC8B 555756CB 5E5FC904
04C48300 14D70A9A 086A0D6A EC8B5557 56CB5E5F C904C483 0014D70A 9A086A0C
0F6AEC8B 555756CB 5E5FC904 C4830014 D70A9A04 6A0E6AEC 8B555756 CB5E5FC9
C904C483 0014D70A 9A066A10 6AEC8B55 5756CB5E 5FC904C4 830014D7 0A9A046A
05C7CD7E 3EC52E11 760014B3 AE9ACD76 1EDC2E0A 46DD0000 28C85756 00CB5E5F
C4830014 B4C89A00 14B3B39A 0A46DD50 E0468D16 F62B00C0 E9CD8206 DD2E0022
5EDD0A6E DCCD8A06 DD2E0001 BE0E7600 14B3AE9A CD8A1EDC 2E0A46DD 0A5EDD0C
0EC48300 14D5BA9A 0014B3B3 9AE846DD CD9A680E 036AE85E DD0A4EDC 0A46DD0A
DDF05EDD 0EC48300 14D5BA9A 0014B3B3 9AE846DD CDB2680E 036AF85E DD0A4EDC

DCCD9206 DD2E0B74 F60BE85E DDD876DC F846DCF0 46DDD85E DDF866DC F04601FE
949A0014 B3B39AE8 46DD5008 C4830014 B4139A00 14B3B39A E046DDE8 5EDDE84E
691B001C 14DC405F C0000000 000000CB 5E5FC99B E846DDE8 5EDD0AC4 830014B4
EC1B4097 A7A08FEE 69B83FF6 A09E667F 3BCC3FE0 00000000 0000479E 17B84357
0000406D 25E50F5D 12A840B1 10362F87 4CA53F97 A5C8556E 17B54034 33BA9313
CE9C3EC5 2E0E7700 14B3AE9A CE941EDC 2E0A46DD 00001AC8 57563FF0 00000000
0A46DD50 EE468D16 EC740014 B3AE9ACE A01EDC2E 0A46DD00 A2E9EED9 002105C7
DC2E0A46 DD0A5EDD 0A4EDCCE A806DD2E 0A5EDD0C C4830014 B4A39A00 14B3B39A
0E046AF8 5EDDF04E DCF046DD F05EDDE6 76DCCEA0 26DC2E0A 46DDE65E DDCEA006
9AF846DD CEC0680E 046AE65E DD0EC483 0014D5BA 9A0014B3 B39AF846 DDCEE068
0EDC2ECE B026DC2E EE46DFF8 5EDDF04E DCE676DC 0EC48300 14D5BA9A 0014B3B3
00000000 001C14DC 00000000 0000000 CB5E5FC9 9BF846DD F85EDDF8 46DCCEB8
9607A23E 3FD34413 509F79FF 3FE00000 00000000 3FF6A09E 667F3BCC 3FF00000
23A5D837 3FC7687A 6A68E1A8 C010BE0C E0CFA002 402AE3A0 30793CC4 C024DBB4
8B555756 3FF00000 00000000 C021D27C E3075533 40337B20 999FDC23 C0280390
5FC902C4 830F8068 DF9A0C6A EC8B5557 56CB5E5F C902C483 0F8068DF 9A0D6AEC

DF9A0A6A EC8B5557 56CB5E5F C902C483 0F8068DF 9A0B6AEC 8B555756 CB5E01FE
555756CB 5E5FC902 C4830F80 68DF9A09 6AEC8B55 5756CB5E 5FC902C4 830F8068
C902C483 0F8068DF 9A076AEC 8B555756 CB5E5FC9 02C4830F 8068DF9A 086AEC8B
68DF9A05 6AEC8B55 5756CB5E 5FC902C4 830F8068 DF9A066A EC8B5557 56CB5E5F
8B555756 CB5E5FC9 02C4830F 8068DF9A 046AEC8B 555756CB 5E5FC902 C4830F80
5FC902C4 830F8068 DF9A026A EC8B5557 56CB5E5F C902C483 0F8068DF 9A036AEC
8068DF9A 006AEC8B 555756CB 5E5FC902 C4830F80 68DF9A01 6AEC8B55 5756CB5E
8B555756 00CB5E5F C902C483 0F8068DF 9A0E6AEC 8B555756 CB5E5FC9 02C4830F
149AAC9A 5614AE36 8D1E500C 468B0014 9A2C9A56 14AE368D 1E500A46 8B1E06EC
9A5614AE 368D1E50 0003B8D8 8E001CB8 1E06EC8B 555756CB 5F5E5DE5 8B071F00
14A2368D 00149BCC 9A5614AE 368D1E34 FF14AC36 8D5614A4 368D1E50 00149B6C
B8500001 B8500000 B8058926 0A7EC400 149A8C9A 5614AE36 8D1E5000 32B80489
8B555756 CB5F5E5D E58B071F 0589260E 7EC40014 9ACC9A56 14AE368D 1E500000
E202C783 02C68305 8926028B 0012BE00 06BF104E 8B0A468E D88E001C B81E06EC
A236FF05 8926028B 02C78302 C6830589 26028B00 02BF0589 260E468B 0000BFF3
149C36FF 500001B8 530C5E8B 00149BAC 9A5614A0 368D1E53 0C5E8B53 0A5E8B14

006A5756 000008C8 575600CB 5E5F5DE5 8B071F00 149BEC9A 5614A036 8D1E01FE
FE46895E 5F00149B CC9A50F8 468D1635 FFD1FA3E C52ED1F6 36FF2ED1 F836FF2E
76FF5756 FC5689FA 468902C4 830014D7 E69AFE76 FF27EB10 38B80574 00F87E83
006A5756 000008C8 5756CB5E 5FC9C02B 5E5F002C 00029A0E 76FF5052 0A76FF0C
FE46895E 5F00149B CC9A50F8 468D1635 FFD1FA3E C52ED1F6 36FF2ED1 F836FF2E
50525756 FC5689FA 468902C4 830014D7 E69AFE76 FF27EB10 38B80574 00F87E83
8B55001C 14D2001C 14CCCB5E 5FC9C02B 5E5F002C 00029A0E 76FF0A76 FF0C76FF
1F0F6868 DF9A0676 FF0876FF 0A76FF0C 76FF0E76 FF500000 B850003C B81E06EC
76FF0E76 FF1076FF 1276FF50 0000B850 003CB81E 06EC8B55 00000ACA 5DE58B07
003CB81E 06EC8B55 00000ECA 5DE58B07 1F0F5068 DF9A0676 FF0876FF 0A76FF0C
1F0F6068 DF9A0676 FF0876FF 0A76FF0C 76FF0E76 FF1076FF 1276FF50 0000B850
76FF0E76 FF1076FF 1276FF50 0000B850 003CB81E 06EC8B55 00000ECA 5DE58B07
36FF2EEC 8B555756 00000ECA 5DE58B07 1F0F5868 DF9A0676 FF0876FF 0A76FF0C
D35036FF 2E4474C2 0B0CC483 0014B719 9AD35668 0ED35B68 0ED34E36 FF2ED350
36FF2E22 74C20B0C C4830014 B7199AD3 5D680ED3 62680E50 001205D3 4E068B2E
6A0A75C2 0B0CC483 0014B719 9AD36468 0ED36968 0E500024 05D34E06 8B2ED350

05D34E06 8B2ED350 36FF2ED3 5236FF2E D35436FF 2E02C483 0014D61A 9A0101FE
3A007200 3A69633A 001C1298 001C0EDE 00CB5E5F C908C483 0014D670 9A500024
C70000F8 46C70C75 000A7E83 000008C8 57560000 77003A6F 633A0077 003A6F63
DA7500FC 7E83FE46 895E5F00 1499069A 50FC468D 160A76FF 575629EB 0000FA46
8B000006 C85756CB 5E5FC9FA 568BF846 8BFA5689 F8468902 C4830014 D7E69A50
561274FA 460BFC46 8BFC5689 FA468902 C4830014 D36C9A50 FE46890A 6EF70C46
0002C857 56CB5E5F C9FC568B FA468B5E 5F003400 029AFE76 FF006AFA 76FF5257
76FF1076 FFEC8B55 5756CB5E 5FC95E5F 00149926 9A50FE46 8D160C76 FF575600
FE8B0A46 01C68B0E 4601C68B 00FFBE03 7E00FFFE 81F08B04 C4830014 D7789A0E
0A5EC5C6 8BE5EB07 880A4EFF 0A5EC5E4 2A078A0E 5EC50E4E FF1474C0 0B4FC78B
7EC5FE56 89FC4689 0C568B0A 468B0000 04C85756 CB5E5FC9 0C568B0A 468B0788
46FF0A7E C5E42A05 8A0E46FF 0E7EC514 74C00B4E C68BF08B E42A058A 0E46FF0E
FF2E5756 000002C8 575600CB 5E5FC9FE 568BFC46 8B0005C6 0A7EC5E5 EB05880A
3EC52EE4 2A058AD5 403EC52E 5E5F0014 9C2C9A50 FE468D16 D53836FF 2ED53A36
9C4C9A50 FE468D16 D53836FF 2ED53A36 FF2E5756 0005C6D5 403EC52E 0588D53C
57560588 D5403EC5 2EE42A05 8AD53C3E C52E0000 02C85756 CB5E5FC9 5E5F0014

```
001C14BE CB5E5FC9 5E5F0014 9C4C9A50 FE468D16 D53836FF 2ED53A36 FF2E01FE
9A8C9A50 F4468D16 F676FF57 560008F6 46C70000 0CC85756 001C14C2 001C14BC
149BCC9A 50F4468D 16FF6AD5 B636FF2E D5B836FF 2E006A57 56FE4689 5E5F0014
5600FE02 45C7F87E C5FA5689 F8468902 C4830014 D7E69AFE 76FFFC46 895E5F00
5756001C 14C400CB 5E5FC95E 5F00149B AC9A50F4 468D1600 6AFE76FF FC76FF57
C1DF8B22 7EF73B00 01BF4EF0 5EDD0A46 DDF85EDD 07DD125E C516768B 000010C8
8BDAEB47 F05EDDF0 4EDC0A46 DDF85EDD F846DC0F DCF046DD 145E8E12 5E0303E3
575600CB 5E5FC99B F846DDF8 5EDDF846 DC0FDCF0 46DD145E 8E125E03 03E3C1DF
6805D66E 168B2ED6 6C068B2E FE5689FC 4689D66E 168B2ED6 6C068B2E 000004C8
D4EB12FC 468304C4 830014B9 729A57FE 76FF0C74 003783FC 7EC51A76 FC463B01
0B0C458B 0A7EC5EC 8B555756 001C0EDE CB5E5FC9 5E5F0014 98269A0A 76FF5756
000105F7 00100D81 0C55890A 45891056 8B0E468B 31740E46 0B10468B 39750A45
5E5FC900 000245C7 0A7EC508 EB008002 45C70855 89064589 10568B0E 468B1374
FF0E7EC5 4E1674F6 0BFE5689 FC46890C 568B0A46 8B12768B 000004C8 575600CB
05C6FC46 FFFC7EC5 0B74C00B 4EC68BE6 75C00A05 88FC46FF FC7EC598 058A0E46
0F9068DF 9A0C76FF 0A76FF1E 06EC8B55 575600CB 5E5FC90C 568B0A46 8BEEEB00

F3FD000E B9E3D10A 5E8B0A7E 030A7E03 FE8B0716 16C683F5 8B1F1604 C48301FE
7EC5FE56 89FC4689 0C568B0A 468B0000 04C85756 CB5E5FEB 035D071F E303FCA5
575600CB 5E5FC90C 568B0A46 8BEB75C0 0A0588FC 46FFFC7E C598058A 0E46FF0E
462B0A46 8BF57500 3D800A46 FF0A7EC5 FE5689FC 46890C56 8B0A468B 000004C8
C4830014 B4C89A00 14B3B39A 0A46DD50 F8466D16 000008C8 5756CB5E 5FC948FC
50FE468D 16006A00 6A0A76FF 57560000 02C85756 00CB5E5F C99BF846 DDD8DD0C
FC468B00 00FC46C7 FE46890A 468B0000 04C85756 00CB5E5F C95E5F00 149CEC9A
8B555756 CB5E5FC9 02C48300 14D7C69A 0A76FFEC 8B555756 00CB5E5F C9FE568B
00000000 00000000 00000000 00000000 00000000 00000000 000000CB 5E5FC9EC
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000001 00007065 6E69626D 6F650065 6E69626D 6F630000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00010302 00010203 00000000 00000000 00000000 00000000 00000000 00000000
01020300 01020003 01000302 01000203 00030201 00030102 00020301 00020103
02030100 02030001 02010300 02010003 02000301 02000103 01030200 01030002
00000000 00000000 03020100 03020001 03010200 03010002 03000201 03000102
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
4864253B 64255B1B 00486425 3B64255B 1B004A32 5B1B0000 00000000 00000000
6E6E6168 63207475 706E6920 6E65706F 20746F6E 6E61430A 003A4952 45543A00
0077003A 6F726574 3A000D5C 1B313D54 2C303D4F 2C313D45 3A435D1B 000A6C65
61430A00 0A6C656E 6E616863 20747570 74756F20 6E65706F 20746F6E 6E61430A
6D375B1B 000A786F 626C6961 6D206B73 61742065 7461636F 6C6C6120 746F6E6E
71716C30 281B0000 6D305B1B 00202020 20202020 20006D37 5B1B006D 305B1B00
71717171 71717171 71717171 71717171 71717171 71717171 71717171 71717171
20202020 20202020 20202020 20202020 78483032 3B64255B 1B30281B 006B7171
30323B31 315B1B30 281B0078 20202020 20202020 20202020 20202020 20202020
71717171 71717171 71717171 71717171 71717171 71717171 71717171 71717448
20202020 20202020 20202020 78483032 3B64255B 1B30281B 00757171 71717171
255B1B30 281B0078 20202020 20202020 20202020 20202020 20202020 20202020
20202020 20202020 20202020 20202020 20202020 20202020 20207848 30323B64
1B202020 20202020 78483032 3B34315B 1B30281B 00782020 20202020 20202020
2020206D 305B1B61 61616161 61616161 61616161 61616161 6161616D 373B315B
```

```
20206A71 20302020 20207848 30323B35 315B1B30 281B0078 20202020 202001FE
30281B00 78202020 25253030 3120716D 20202020 20202020 20202020 20202020
71717171 71717171 71717171 71717171 71717171 7171716D 4830323B 36315B1B
5B1B006D 375B1B00 48313B31 5B1B0042 281B6A71 71717171 71717171 71717171
20002020 74697551 20200020 20293166 28202000 20207472 6F624120 00683032
1B73256D 375B1B48 38323B34 315B1B00 7325203A 454C4946 00202029 32662820
00464E49 5F544154 53080000 00010000 00000000 00007374 726F6261 006D305B
00000000 00000000 00080808 0808000E 160C0201 00464E49 5F4D4554 5359530A
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 0000FFFE 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 0C760000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
6261742F 63696C62 75700054 554C444E 0054554C 444E0020 00000000 00000000
54554C44 4E005455 4C444E00 54554C44 4E005455 4C444E00 54554C44 4E00656C
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
41525400 656C6261 742F6369 6C627570 00534E41 52540053 4E415254 00000000
00000000 0000534E 41525400 534E4152 5400534E 41525400 534E4152 5400534E
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
65706F20 746F6E6E 61430A00 77003A6F 7265743A 00000000 00000000 00000000
38323B34 315B1B00 7374726F 6261000A 6C656E6E 61686320 74757074 756F206E
54415453 5F544154 530B0046 4E495F54 41545308 006D305B 1B73256D 375B1B48
00000000 00000000 00000000 00000000 00464E49 5F4D4554 5359530A 00005355
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

0000FFFF FFFF0000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
756E5F6E 6F697372 65765F6D 6172676F 72700000 00000000 00000000 00000000
202C2A3D 6D75736B 63656863 2C2A2A2A 2A2A2A2A 2A2A2A2A 2A2A2A3D 7265626D
20202020 20200000 53533A4D 4D3A4848 00000059 592F4444 2F4D4D3D 65746164
61736964 00656572 66700063 6F6C6C61 63701390 00002020 20202020 20202020
45505308 0000646E 65707375 735F656C 62616E65 00646E65 70737573 5F656C62
00000000 004D4553 5F4D5245 54080046 4E495F4D 45545359 530A004A 4C414943
00000000 00000000 00000000 00000000 00000000 00000000 00000000 00000000
00000000 00000000 00000000 00000000 00000000 00000000 00000000 00000000
00000000 FFFF0000 00000000 00000000 00000000 00000000 00000000 00000000
00000000 00000053 52455445 4D415241 500A0000 FFFF7862 6D69646E 77070000
00000000 0000000A 00014358 4503FFFF 4B434154 53055842 4D505345 52070000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
591FA4F2 FCFE5E8E 1E084E8B 0E7EC406 0A76C4EC 8B550000 1E8E2E1E 00000000
1E07C28C 085EC406 0C4E8B0E 7EC40612 76C4EC8B 5500001E 8E2E1E00 0ACA1F5D
00000000 00000000 0000000E CA1F5D59 1FF7E2AA 1FD7DA8E 1EAC09E3 FCFE5E8E
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
CA1F5DAA F2FC084E 8B0C7EC4 0A468AEC 8B550000 1E8E2E1E 00000000 00000000
00000000 00000000 00000000 00000000 00000000 00000000 00000000 00000008
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000200 B2E40000 00000000 00000024 D0E60000 00000000 00000000 00000000
49E249DE 0BC20003 0000001C 00240014 001C0000 0000D0E6 D0E60000 00000000
3DFA3DDB 3DB13D97 3D833D6F 3D513D3A 3D3249FE 49FA49F6 49F249EE 49EA49E6
3FBA3FAA 3F8C3F69 3F3F3F11 3EFC3EEC 3ED23EB2 3E943E71 3E5C3E43 3E343E17
40E640D2 4A164A12 4A0E4A0A 4A064A02 40834070 40404030 40244005 3FF13FCF
431E42EF 42EA42D8 42854270 42574248 4220420B 41F241E3 416F4148 412E4106
45794561 452B4513 449C4497 4481447C 446A4435 44204407 43F843D2 43CD4359
47DD47AC 47774746 4737471F 470F46D9 46C14690 46584640 463045FA 45E245B1
```

| | | | | | | | |
|---|---|---|---|---|---|---|---|
| 48D248C5 | 48AE48A1 | 48914886 | 4881487C | 48774872 | 4863484B | 483B482B | 47F501FE |
| 61A26196 | 6192618E | 618A6184 | 6180617C | 61786174 | 6170616C | 49C249A0 | 49794A1A |
| 61EA61E6 | 61E261DE | 61DA61D6 | 61D261CE | 61CA61C6 | 61C261BE | 61BA61B6 | 61B261A6 |
| 58CF5853 | 5841582D | 581857FD | 57D757B7 | 573C5737 | 57175712 | 620261FE | 61FA61EE |
| 5CB95C99 | 5C505BFA | 5BE35BB8 | 5B4259BB | 59B65992 | 598D5949 | 592D5928 | 58F058D4 |
| 60906216 | 6212620E | 620A6206 | 5FBF5F9D | 5F615EFB | 5E5E5E40 | 5E3B5DD9 | 5DB15CE1 |
| ABDAABB8 | AB63AB29 | AB24AB02 | AAFDAEC4 | AEC0AEBA | AEB66161 | 614F613D | 612B610A |
| 8CB2AEA2 | ADF1ADB5 | AD79ACFA | ACCAAEE0 | AEDCAC83 | AC32AED8 | AED4AED0 | AECCAEC8 |
| 87BD878C | 8CEC8CE8 | 8CE48CE0 | 8CDC8CD8 | 8CD48CD0 | 8CCC8CC8 | 8CC48CC0 | 8CBC8CB8 |
| 89B8898C | 89718947 | 892188D9 | 88D488B4 | 88AF880F | 880A87EF | 87EA87E1 | 87CE87C9 |
| 16EE16EA | 16E616E2 | 8CA68C94 | 8C838C16 | 8BB08B4A | 8AE78CFC | 8CF88A95 | 8A2489F9 |
| 1732172E | 17261722 | 171E171A | 17161712 | 170E170A | 17061702 | 16FE16FA | 16F616F2 |
| 173605AF | 059D0466 | 043803D9 | 03A4038B | 02A3029E | 025A0255 | 019E017C | 002F000E |
| 06FB06C4 | 06B50679 | 066A065B | 06350626 | 060D05CD | 174E174A | 17461742 | 173E173A |
| 0EAB0BFC | 0B8A09CC | 09860856 | 08510849 | 084407B0 | 07941756 | 1752076F | 074F0721 |
| A7F8A7DE | A7BDA724 | A70AA6F5 | A6D4A6A2 | A67C15E4 | 152D1476 | 13BF10D0 | 10190F62 |
| 7AD87AD4 | AABCAA9A | AA71AA4F | AA15A9FE | A9A8A979 | A913A8F9 | A8D9A8B1 | A88201FE |
| 760974C6 | 74A6748F | 73C0739F | 737B7359 | 7B027AFE | 7AFA7AF6 | 7AF07AE4 | 7AE07ADC |
| 76C4767B | 7B267B22 | 7B1E7B1A | 7B167B12 | 7B0E7B0A | 7B067663 | 76517642 | 762E761F |
| 78DE78D9 | 787B785B | 78257B2E | 7B2A7806 | 77E777A9 | 7795774C | 773D7729 | 76F676E2 |
| 5692568E | 568A5686 | 5682567E | 567A5676 | 5672566E | 566A5666 | 7A9579E4 | 78EB78E6 |
| 4F034EF0 | 4DE34DCB | 4DAA4D98 | 56BA56B6 | 56B256AE | 56AA56A6 | 56A2569E | 569A5696 |
| 2D092CE7 | 2CB63CB0 | 55D7557E | 54BF54A0 | 54535427 | 53D753AB | 535B5313 | 508C56BE |
| 3CC43CC0 | 3CBC3CB8 | 3CB42F00 | 2EDE2EB5 | 2E932E21 | 2DFF2DCE | 2DB42D8D | 2D6B2D3A |
| 30C02F31 | 3CFE3CFA | 3CF63CF2 | 3CEE3CEA | 3CE63CE2 | 3CDE3CD8 | 3CD43CD0 | 3CCC3CC8 |
| 364A3638 | 36213576 | 354234DF | 34C13431 | 33FD33D8 | 33BA3D02 | 323231FD | 3179314F |
| 3C6F3C50 | 3B553B36 | 3B1F3B00 | 39DC39C5 | 396B3909 | 38E738C9 | 3868383E | 37AF3677 |
| 623B6AD0 | 6ACC6AC8 | 6AC4B575 | B4AEB3A2 | B398B38F | B37AB36A | B367B303 | 3CA53C86 |
| 63E263B8 | 63A26381 | 63666AD4 | 633D632D | 63186302 | 62E162DA | 62C462A4 | 625E6254 |
| 6AF46AF0 | 6AEC6AE8 | 6AE46AE0 | 6ADC6AD8 | 64B36495 | 647D6459 | 6436642F | 6413640B |
| 667B6653 | 663965D8 | 65C265A1 | 6550652F | 651C64EE | 6B0C6B08 | 6B046B00 | 6AFC6AF8 |
| 68516846 | 68196B24 | 6E206B1C | 6B1067CC | 67B1678F | 6761674E | 672D66E2 | 66C26691 |
| 6A556A3F | 6A216A07 | 69E969E2 | 69CA69A9 | 69936976 | 6964692F | 69106892 | 688D01FE |
| 17D817C6 | 2BB02BAC | 2BA82BA4 | 2BA02B9C | 1790177E | 2B982B94 | 6AB96AA8 | 6A966A72 |
| 18A11876 | 18622BD8 | 2BD42BD0 | 2BCC2BC8 | 2BC42BC0 | 2BBC2BB8 | 2BB41841 | 182F180B |
| 2BE01A80 | 1A611A3E | 1A0C19E3 | 2BDC19AC | 19971982 | 19621936 | 192518F7 | 18DC18BB |
| 1C031BC5 | 1B9D1B8F | 1B511B1D | 1B0A1ACC | 2C002BFC | 2BF82BF4 | 2BF02BEC | 2BE82BE4 |
| 1E111E06 | 1DED1D80 | 1D391CFD | 2C182C10 | 2C0C2C08 | 2C041CD7 | 1CB01C72 | 1C3E1C1E |
| 2C2C2C28 | 2C242C20 | 2C1C202F | 1F6B1F36 | 1F011EBC | 1EA91E9A | 1E8A1E6C | 1E4E1E31 |
| 215B213F | 212D210F | 20FD20DF | 20CD20B1 | 209F2081 | 206F2053 | 204A2C38 | 2C342C30 |
| 22162C5C | 2C582C54 | 2C502C4C | 2C482C44 | 2C402C3C | 21D521C9 | 21B7219B | 2189216D |
| 2626260E | 25FD25BF | 2581253A | 24EA249F | 2458240D | 23B72368 | 230B2290 | 22502234 |
| 2C7C2C78 | 2C742C70 | 2C6C2C68 | 2C642726 | 270C2702 | 26EC26D6 | 26AB2679 | 2C60262E |
| 28BF288C | 286F284B | 2839280C | 27FA27D2 | 27E727AA | 27A2277A | 275F2757 | 2C8C2C88 |
| 2A982A7D | 2A3229EA | 29E529BB | 29AF299D | 29862978 | 29452932 | 291C28F6 | 28E428CD |
| 6B696B56 | 6B436B30 | 2B8B2B7D | 2B722B55 | 2B3A2B0F | 2C942C90 | 2AFC2AEE | 2ADC2ACA |
| 6C996C86 | 6C736C60 | 6C4D6C3A | 6C276C14 | 6C016BEE | 6BDB6BC8 | 6BB56BA2 | 6B8F6B7C |
| 6DC96DB6 | 6DA36D90 | 6D7D6D6A | 6D576D44 | 6D316D1E | 6D0B6CF8 | 6CE56CD2 | 6CBF6CAC |
| 6EE66ED3 | 6EC06EAD | 6E9A6E87 | 6E746E61 | 6E4E6E3B | 6E286E15 | 6E026DEF | 6DDC01FE |
| 70167003 | 6FF06FDD | 6FCA6FB7 | 6FA46F91 | 6F7E6F6B | 6F586F45 | 6F326F1F | 6F0C6EF9 |
| 71467133 | 7120710D | 70FA70E7 | 70D470C1 | 70AE709B | 70887075 | 7062704F | 703C7029 |
| 72767263 | 7250723D | 722A7217 | 720471F1 | 71DE71CB | 71B871A5 | 7192717F | 716C7159 |
| 81667B8D | 7B798162 | 7B51815E | 73347321 | 730E72FB | 72E872D5 | 72C272AF | 729C7289 |
| 7D718172 | 7D407D17 | 7CF17CDD | 816E7CAF | 7C7D7C4B | 7C2B7C05 | 7BF1816A | 7BC97BB5 |
| 7F507F3C | 817E7F08 | 7EF4817A | 7EC07E97 | 7E6B7E3F | 7E107DEA | 7DCA7DB6 | 81767D85 |
| 810B80E5 | 80BF80AB | 818E807A | 8066818A | 80358006 | 7FE07FCC | 81867F98 | 7F848182 |
| AFE3AFD0 | AFBDAFAA | AF97AF84 | AF71AF5E | AF4BAF38 | AF25AF12 | AEFFAEEC | 81538192 |
| B113B100 | B0EDB0DA | B0C7B0B4 | B0A1B08E | B07BB068 | B055B042 | B02FB01C | B009AFF6 |
| B243B230 | B21DB20A | B1F7B1E4 | B1D1B1BE | B1ABB198 | B185B172 | B15FB14C | B139B126 |
| CF8FCF7C | CF69CF56 | CF43CF30 | CF1DCF0A | B2DBB2C8 | B2B5B2A2 | B28FB27C | B269B256 |
| CBD8CBC3 | CBAECB99 | CB84CB6F | CB5ACB45 | CB30D014 | D001CFEE | CFDBCFC8 | CFB5CFA2 |
| A250A23D | A22AA217 | A204A1F1 | A1DED71A | CC80CC6B | CC56CC41 | CC2CCC17 | CC02CBED |
| A380A36D | A35AA347 | A334A321 | A30EA2FB | A2E8A2D5 | A2C2A2AF | A29CA289 | A276A263 |
| A4B0A49D | A48AA477 | A464A451 | A43EA42B | A418A405 | A3F2A3DF | A3CCA3B9 | A3A6A393 |

| | | | | | | | |
|---|---|---|---|---|---|---|---|
| A5CDA5BA | A5A7A594 | A581A56E | A55BA548 | A535A522 | A50FA4FC | A4E9A4D6 | A4C301FE |
| D053D041 | D032D80D | D40CD3EB | D3CAD3A2 | D391A652 | A63FA62C | A619A606 | A5F3A5E0 |
| C942C925 | C90EC8EF | C8C8C8A2 | C88BC86C | C845D12B | D114D0C6 | D0AED091 | D07CD064 |
| D4CED542 | D53ED53A | BDEABDA2 | BD97BD79 | BCEFBCA7 | BC9CBC7E | BE96C9A4 | C98DC96E |
| 944C9804 | 940993F8 | 93CE93A2 | 93919367 | 93299318 | 92F49800 | 92C592A6 | D530D4FE |
| 95F19818 | 95A99596 | 957E954E | 9539951F | 95079814 | 94EC9810 | 94C5980C | 949B9808 |
| 97909824 | 9820975A | 970F96F2 | 96DA96C6 | 9699967D | 981C964F | 963F9638 | 9614960A |
| BB8EBB80 | BB6EBB58 | BB49BB2F | BAE6BAD2 | BAC4BA87 | BA79BA5E | BA5097F5 | 97D197A8 |
| C249C23E | C225C20D | C1F3C1D9 | C1BFC19F | C184C144 | C139C118 | C104C0E6 | C2D2BBB5 |
| 8EFC8EA5 | 8E858E72 | 8E588E3B | 8E1A8DF9 | 8DB18D92 | 8D[illegible]18D68 | 8D41C2C2 | C27AC269 |
| 91409126 | 90FF90B0 | 90989063 | 90439030 | 90168FF9 | 8FD88FB7 | 8F6C8F4D | 8F3C8F23 |
| BEB0D5AD | D588D57B | D55CD5B8 | 92829262 | 924F9235 | 921891F7 | 91D691C5 | 91709151 |
| C097C078 | C047C02A | C014BFFD | BFDEBFBE | BFA0BF81 | BF5BBF4E | BF2CBF15 | BEF6BEC7 |
| A150A148 | A140A13C | A138A134 | D7DDD1EC | D1D1D1B9 | D18CD171 | D159D1FC | D1F8C0AE |
| 9FE49FD8 | 9FD39FC1 | 9FBC9F6D | 9F579EB6 | 9EA89E37 | 9D8A9D82 | 9D1D9D18 | A16CA164 |
| B7EBB7C7 | B7A8B796 | B72EB710 | BA2AD664 | D651D66E | A0B5A0B0 | A094A021 | A01C9FFA |

| | | | | | | | |
|---|---|---|---|---|---|---|---|
| C9F6C9F1 | C9D4C9C5 | CB0AB9CA | B9ACB998 | B981B942 | B8FFB8E3 | B8A3B884 | B81801FE |
| C49ED7B6 | D7B1CAB4 | CAAFCA97 | CA92CA82 | CA7DCA73 | CA64CA4A | CA2FCA2A | CA18CA09 |
| 842A825E | 820981CB | 81AF8748 | D344D324 | D316D2F4 | D2D2D354 | D350C44A | C440C3FE |
| CE0CCE07 | CDF8CDDB | CE9ED422 | 86EE86D1 | 862585FC | 85C38578 | 84E784DE | 84A6848C |
| CD60CD54 | CD4FCD1D | CD18CD01 | CCFCCCD5 | CCC2CCBD | CC9BCD80 | CE6BCE66 | CE52CE4D |
| D2ADD28E | D27DD25E | D24DD22E | D21DD204 | C80DC79E | C76EC736 | C6FEC6D3 | C828CD65 |
| 9A679A47 | 9A279A07 | 99999981 | 99619941 | 99219901 | 98E198C1 | 98A19881 | 98619841 |
| 9C679C47 | 9C279C07 | 9BE79BC7 | 9BA79B87 | 9B679B47 | 9B279B07 | 9AE79AC7 | 9AA79A87 |
| 00042020 | 20312E47 | 4553453F | 0A00033F | 54444C04 | 00029D07 | 9CE79CC7 | 9CA79C87 |
| 5F534554 | 59424556 | 4F4D0E00 | 064B4341 | 54530500 | 05202020 | 312E4745 | 53443F0A |
| 41445F53 | 4F495445 | 4E0B0008 | 45444F43 | 5F534554 | 59425445 | 530D0007 | 45444F43 |
| 00010000 | 00000000 | 00000000 | 00000000 | 00000000 | 00000000 | 00000018 | 00064154 |
| 01330000 | 01060000 | 00DC0000 | 00AF0000 | 00810000 | 00540000 | 002D0000 | 0004009C |
| 02720000 | 02490000 | 02200000 | 01F80000 | 01D10000 | 01A80000 | 01810000 | 015B0000 |
| 03C10000 | 03990000 | 036F0000 | 03420000 | 03190000 | 02ED0000 | 02C40000 | 029D0000 |
| 04FE0000 | 04D30000 | 04AD0000 | 04840000 | 045F0000 | 04380000 | 04120000 | 03E90000 |

| | | | | | | | |
|---|---|---|---|---|---|---|---|
| 00000619 | 000005F0 | 000005C7 | 0000059D | 00000576 | 0000054F | 00000525 | 000001FE |
| 000001F4 | 000000D5 | 00000046 | 0000003B | 00000027 | 00000010 | 00000003 | 07E00003 |
| 0000089D | 00000852 | 000007D2 | 000006B7 | 00000515 | 00000504 | 00000430 | 00000230 |
| 00000B16 | 00000A9E | 00000A53 | 00000A12 | 00000970 | 00000928 | 00000916 | 000008EE |
| 00000E64 | 00000E02 | 00000DCC | 00000D7C | 00000C55 | 00000B89 | 00000B78 | 00000B4F |
| 00001074 | 0000105A | 0000101F | 00000F1F | 00000F0B | 00000EF8 | 00000EC7 | 00000E9F |
| 0000135A | 0000132A | 000012F1 | 000012BD | 00001252 | 00001239 | 0000113D | 00001080 |
| 00001613 | 000015EB | 000015CE | 00001554 | 000014E5 | 0000148A | 0000143A | 000013B3 |
| 00001870 | 00001838 | 00001801 | 000017DD | 00001757 | 000016D2 | 0000164D | 00001643 |
| 00001A6C | 00001A4F | 00001A2B | 000019DE | 000019C4 | 000019AD | 000018ED | 0000187B |
| 00001D5C | 00001CFF | 00001CC5 | 00001B9D | 00001B90 | 00001B60 | 00001AFC | 00001AA5 |
| 00001F7E | 00001F5E | 00001F15 | 00001E7C | 00001E2E | 00001E19 | 00001DCE | 00001DA1 |
| 00002164 | 00002107 | 000020AA | 00002090 | 00002085 | 0000204D | 00002008 | 00001FC3 |
| 000024EF | 00002480 | 0000238C | 00002316 | 00002259 | 00002220 | 000021E7 | 000021C2 |
| 00002748 | 000026E1 | 000026A3 | 00002665 | 000025FD | 000025BA | 00002565 | 00002511 |
| 000029E0 | 00002975 | 0000292B | 00002856 | 00002849 | 00002808 | 000027C3 | 00002785 |

| | | | | | | | |
|---|---|---|---|---|---|---|---|
| 2D6B0000 | 2D400000 | 2D000000 | 2CEE0000 | 2B630000 | 2B560000 | 2AF60000 | 2ABE01FE |
| 2FBA0000 | 2F940000 | 2EF00000 | 2ED50000 | 2E3D0000 | 2DF70000 | 2DC60000 | 2D8E0000 |
| 31170000 | 31000000 | 30E40000 | 30CC0000 | 30B50000 | 30A20000 | 30930000 | 305F0000 |
| 31C30000 | 31B10000 | 319A0000 | 31870000 | 31740000 | 31620000 | 31480000 | 31320000 |
| 32700000 | 325C0000 | 32470000 | 322C0000 | 32180000 | 32040000 | 31EE0000 | 31D60000 |
| 33320000 | 33190000 | 33030000 | 32E70000 | 32CE0000 | 32B80000 | 329C0000 | 32860000 |
| 33FD0000 | 33E40000 | 33CE0000 | 33B50000 | 339B0000 | 33810000 | 336A0000 | 334E0000 |
| 34D70000 | 34BB0000 | 349E0000 | 34800000 | 34670000 | 344B0000 | 34320000 | 34180000 |
| 35980000 | 35820000 | 356A0000 | 35540000 | 353E0000 | 35250000 | 350C0000 | 34F20000 |
| 36670000 | 36520000 | 36370000 | 361E0000 | 36020000 | 35E80000 | 35CB0000 | 35B00000 |
| 37100000 | 36FD0000 | 36EA0000 | 36D30000 | 36BF0000 | 36A80000 | 36920000 | 367D0000 |
| 37B60000 | 379F0000 | 378C0000 | 377A0000 | 37670000 | 37550000 | 373F0000 | 37280000 |
| 38820000 | 38680000 | 384E0000 | 38360000 | 381E0000 | 38040000 | 37E90000 | 37CD0000 |
| 39490000 | 39310000 | 39160000 | 38FF0000 | 38E40000 | 38CD0000 | 38B60000 | 389B0000 |
| 3A050000 | 39EB0000 | 39D70000 | 39C40000 | 39AD0000 | 39950000 | 39820000 | 39640000 |
| 3AD00000 | 3AB90000 | 3A960000 | 3A820000 | 3A640000 | 3A4F0000 | 3A370000 | 3A1A0000 |

| | | | | | | | |
|---|---|---|---|---|---|---|---|
| 00003B89 | 00003B69 | 00003B4A | 00003B29 | 00003B04 | 00003AEF | 00003ADB | 000001FE |
| 00003D57 | 00003D1B | 00003CCB | 00003C96 | 00003C72 | 00003C42 | 00003BEF | 00003B9E |
| 00003EDF | 00003EA0 | 00003E62 | 00003E35 | 00003E04 | 00003DCF | 00003D92 | 00003D6D |
| 0000408D | 00004062 | 0000403E | 00004003 | 00003FC7 | 00003F8D | 00003F66 | 00003F25 |
| 00004167 | 0000414F | 00004136 | 0000411A | 000040FF | 000040E4 | 000040D7 | 0000409F |
| 00004225 | 00004211 | 000041FD | 000041E6 | 000041CF | 000041B9 | 0000419C | 0000417F |
| 000042F4 | 000042DB | 000042C3 | 000042AD | 00004292 | 00004277 | 0000425B | 00004240 |
| 000043C0 | 000043A7 | 0000438E | 00004374 | 0000435B | 0000433F | 00004323 | 0000430C |
| 0000448D | 00004475 | 0000445A | 00004441 | 00004428 | 00004410 | 000043F4 | 000043D8 |
| 00004554 | 0000453C | 00004525 | 0000450E | 000044F2 | 000044DC | 000044C4 | 000044A8 |
| 00004633 | 00004616 | 000045F9 | 000045DD | 000045C1 | 000045A3 | 0000458A | 0000456C |
| 000046F2 | 000046D8 | 000046C0 | 000046A8 | 00004692 | 00004679 | 0000465D | 0000464D |
| 000047D0 | 000047B0 | 00004790 | 00004776 | 0000475C | 00004742 | 0000472A | 0000470F |
| 0000488F | 00004878 | 00004860 | 00004847 | 0000482E | 00004811 | 000047F9 | 000047EC |
| 0000495E | 00004940 | 00004923 | 00004907 | 000048F4 | 000048DD | 000048C4 | 000048AB |
| 00004A0D | 000049F6 | 000049DF | 000049D1 | 000049BA | 000049B5 | 00004999 | 0000497C |

| | | | | | | | |
|---|---|---|---|---|---|---|---|
| 4AD20000 | 4ABA0000 | 4AA30000 | 4A880000 | 4A6B0000 | 4A550000 | 4A3D0000 | 4A2201FE |
| 4B940000 | 4B7D0000 | 4B650000 | 4B500000 | 4B350000 | 4B190000 | 4AFC0000 | 4AE80000 |
| 4C5F0000 | 4C470000 | 4C300000 | 4C170000 | 4BFE0000 | 4BE20000 | 4BC50000 | 4BAF0000 |
| 4D170000 | 4D010000 | 4CEF0000 | 4CD90000 | 4CC30000 | 4CA80000 | 4C8D0000 | 4C760000 |
| 4DD50000 | 4DB40000 | 4D9D0000 | 4D890000 | 4D750000 | 4D5A0000 | 4D450000 | 4D2E0000 |
| 4E950000 | 4E7C0000 | 4E660000 | 4E490000 | 4E340000 | 4E1B0000 | 4E060000 | 4DEA0000 |
| 4F4C0000 | 4F300000 | 4F190000 | 4F090000 | 4EF10000 | 4EDC0000 | 4EC20000 | 4EAC0000 |
| 50560000 | 504A0000 | 50250000 | 4FE90000 | 4FAB0000 | 4F9F0000 | 4F850000 | 4F6B0000 |
| 517E0000 | 51250000 | 511B0000 | 51080000 | 50E70000 | 50CF0000 | 50CA0000 | 50710000 |
| 532C0000 | 53030000 | 52FA0000 | 529E0000 | 52430000 | 522E0000 | 52230000 | 51D80000 |
| 542A0000 | 53DF0000 | 53C80000 | 53A90000 | 538F0000 | 53770000 | 536A0000 | 534B0000 |
| 56350000 | 55DC0000 | 55710000 | 55570000 | 553C0000 | 55080000 | 54C90000 | 54760000 |
| 57F10000 | 57CA0000 | 57C00000 | 57990000 | 576B0000 | 57470000 | 56A60000 | 565B0000 |
| 5A7E0000 | 5A700000 | 5A420000 | 594B0000 | 59400000 | 588A0000 | 58440000 | 58170000 |
| 5EAD0000 | 5EA20000 | 5E480000 | 5E310000 | 5E260000 | 5CFD0000 | 5CA00000 | 5B840000 |
| 60CE0000 | 60C10000 | 60770000 | 602E0000 | 600B0000 | 5FFE0000 | 5F7A0000 | 5F130000 |

| | | | | | | | |
|---|---|---|---|---|---|---|---|
| 0000003E | 0000002B | 00000017 | 00000002 | 085C0005 | 0000610C | 00006101 | 000001FE |
| 000000C7 | 000000B0 | 0000009C | 00000090 | 00000084 | 00000078 | 0000005F | 0000004F |
| 00000172 | 00000162 | 0000014A | 00000132 | 0000011A | 00000106 | 000000EE | 000000DE |
| 00000215 | 00000200 | 000001ED | 000001D7 | 000001C7 | 000001B8 | 000001A1 | 0000018A |
| 00000296 | 00000287 | 0000027A | 00000264 | 0000024F | 00000241 | 00000230 | 00000222 |
| 00000324 | 0000030D | 000002FA | 000002E9 | 000002D9 | 000002C7 | 000002BA | 000002A5 |
| 000003C3 | 000003AF | 000003A0 | 0000038C | 00000379 | 00000366 | 0000034E | 00000337 |
| 00000475 | 00000460 | 0000044C | 00000434 | 00000421 | 0000040D | 000003F4 | 000003DB |
| 00000523 | 0000050F | 000004F7 | 000004E2 | 000004CE | 000004BA | 000004A6 | 0000048D |
| 000005B6 | 000005A3 | 00000593 | 0000057E | 00000571 | 00000564 | 0000054E | 00000538 |
| 00000644 | 00000631 | 00000621 | 0000060E | 000005FD | 000005ED | 000005DB | 000005CB |
| 000006E1 | 000006CC | 000006BD | 000006A8 | 00000690 | 0000067D | 00000666 | 00000655 |
| 00000770 | 00000760 | 0000074E | 0000073C | 00000727 | 00000717 | 00000708 | 000006EF |
| 00000815 | 000007FD | 000007E8 | 000007D1 | 000007BF | 000007AC | 00000799 | 00000784 |
| 000008B5 | 000008A1 | 0000088B | 00000875 | 00000861 | 0000084E | 0000083C | 00000826 |
| 00000952 | 00000942 | 00000930 | 0000091E | 00000906 | 000008EF | 000008DC | 000008C9 |

| | | | | | | | |
|---|---|---|---|---|---|---|---|
| 09F20000 | 09E20000 | 09C90000 | 09B10000 | 099C0000 | 09880000 | 09780000 | 096901FE |
| 0A8C0000 | 0A7C0000 | 0A670000 | 0A540000 | 0A420000 | 0A2B0000 | 0A140000 | 0A010000 |
| 0B1B0000 | 0B090000 | 0AF60000 | 0AE30000 | 0ACA0000 | 0AB80000 | 0AA90000 | 0A9A0000 |
| 0BCC0000 | 0BB60000 | 0BA00000 | 0B8A0000 | 0B780000 | 0B5E0000 | 0B4D0000 | 0B2E0000 |
| 0C690000 | 0C5A0000 | 0C420000 | 0C2D0000 | 0C190000 | 0C030000 | 0BF50000 | 0BDB0000 |
| 0D0E0000 | 0CFC0000 | 0CE60000 | 0CD20000 | 0CBB0000 | 0CA90000 | 0C910000 | 0C800000 |
| 0DB10000 | 0D9B0000 | 0D870000 | 0D700000 | 0D610000 | 0D4E0000 | 0D370000 | 0D260000 |
| 0E500000 | 0E3B0000 | 0E290000 | 0E1A0000 | 0E000000 | 0DF20000 | 0DDA0000 | 0DC60000 |
| 0EF60000 | 0EE50000 | 0ED10000 | 0EBA0000 | 0EA70000 | 0E900000 | 0E7E0000 | 0E680000 |
| 0F960000 | 0F830000 | 0F680000 | 0F550000 | 0F470000 | 0F320000 | 0F1D0000 | 0F080000 |
| 10270000 | 10180000 | 10060000 | 0FF10000 | 0FDF0000 | 0FCF0000 | 0FB90000 | 0FA70000 |
| 10B60000 | 10A50000 | 10940000 | 10830000 | 10740000 | 105D0000 | 104D0000 | 10370000 |
| 11490000 | 11320000 | 111B0000 | 110D0000 | 10FC0000 | 10EB0000 | 10DA0000 | 10CB0000 |
| 11EE0000 | 11DA0000 | 11C20000 | 11AF0000 | 11980000 | 11830000 | 116E0000 | 115C0000 |
| 129F0000 | 128B0000 | 12720000 | 12590000 | 12460000 | 122E0000 | 12190000 | 12050000 |
| 133F0000 | 132A0000 | 13130000 | 12FF0000 | 12EA0000 | 12D70000 | 12C70000 | 12B30000 |

| | | | | | | | |
|---|---|---|---|---|---|---|---|
| 000013DC | 000013C8 | 000013B0 | 00001398 | 00001381 | 0000136E | 00001354 | 000001FE |
| 00001490 | 00001478 | 00001462 | 00001449 | 00001432 | 00001420 | 00001408 | 000013F4 |
| 0000153C | 00001523 | 0000150B | 000014F9 | 000014E5 | 000014D0 | 000014BC | 000014A5 |
| 000015EF | 000015D9 | 000015C9 | 000015B1 | 00001597 | 00001582 | 0000156A | 00001553 |
| 0000169F | 00001687 | 00001670 | 0000165E | 0000164A | 00001636 | 0000161A | 00001605 |
| 00001759 | 00001740 | 0000172B | 00001712 | 000016FC | 000016E0 | 000016CC | 000016B5 |
| 0000180A | 000017F5 | 000017E2 | 000017C8 | 000017B3 | 0000179A | 00001781 | 0000176D |
| 000018B5 | 000018A2 | 00001893 | 00001879 | 00001861 | 00001849 | 00001836 | 00001821 |
| 00001960 | 0000194F | 0000193B | 00001929 | 00001911 | 000018FD | 000018E8 | 000018D2 |
| 000019FC | 000019E5 | 000019D3 | 000019BE | 000019AD | 00001997 | 00001985 | 00001974 |
| 00001A90 | 00001A7E | 00001A65 | 00001A55 | 00001A43 | 00001A2E | 00001A22 | 00001A0F |
| 00001B2A | 00001B0F | 00001AFC | 00001AE9 | 00001AD8 | 00001ACA | 00001AB8 | 00001AA8 |
| 00001BC8 | 00001BB1 | 00001B9E | 00001B8B | 00001B76 | 00001B63 | 00001B53 | 00001B41 |
| 00001C67 | 00001C54 | 00001C41 | 00001C2D | 00001C1A | 00001C03 | 00001BF2 | 00001BE0 |
| 00001D17 | 00001D00 | 00001CEC | 00001CD3 | 00001CBA | 00001CA9 | 00001C98 | 00001C7F |
| 00001DA8 | 00001D9A | 00001D8C | 00001D80 | 00001D6B | 00001D54 | 00001D41 | 00001D2E |

| | | | | | | | |
|---|---|---|---|---|---|---|---|
| 1E260000 | 1E160000 | 1E070000 | 1DF90000 | 1DEB0000 | 1DDC0000 | 1DC80000 | 1DB601FE |
| 1EB90000 | 1EA30000 | 1E8B0000 | 1E7B0000 | 1E6D0000 | 1E5B0000 | 1E4C0000 | 1E360000 |
| 1F440000 | 1F2D0000 | 1F210000 | 1F120000 | 1EFD0000 | 1EEB0000 | 1EDE0000 | 1ECA0000 |
| 1FEF0000 | 1FDA0000 | 1FC30000 | 1FAA0000 | 1F940000 | 1F870000 | 1F6E0000 | 1F5A0000 |
| 20730000 | 20640000 | 20540000 | 20440000 | 20340000 | 20220000 | 20150000 | 20070000 |
| 20F90000 | 20E10000 | 20D10000 | 20C10000 | 20B40000 | 20A20000 | 20910000 | 20800000 |
| 21610000 | 21550000 | 21480000 | 213B0000 | 212E0000 | 21210000 | 21130000 | 21060000 |
| 21C90000 | 21BC0000 | 21AF0000 | 21A20000 | 21950000 | 21880000 | 217B0000 | 216E0000 |
| 222F0000 | 22220000 | 22160000 | 22090000 | 21FD0000 | 21F00000 | 21E30000 | 21D60000 |
| 22980000 | 228B0000 | 227D0000 | 22720000 | 22630000 | 22560000 | 22490000 | 223B0000 |
| 23010000 | 22F40000 | 22E70000 | 22D80000 | 22CB0000 | 22BE0000 | 22B00000 | 22A30000 |
| 23730000 | 23670000 | 23590000 | 234A0000 | 233C0000 | 232D0000 | 231F0000 | 23100000 |
| 23DB0000 | 23CE0000 | 23C10000 | 23B40000 | 23A80000 | 239B0000 | 238E0000 | 23800000 |
| 24440000 | 24370000 | 242A0000 | 241D0000 | 24100000 | 24030000 | 23F60000 | 23E80000 |
| 24C30000 | 24AE0000 | 24A00000 | 248F0000 | 247F0000 | 24700000 | 24610000 | 24500000 |
| 253F0000 | 252F0000 | 25210000 | 250F0000 | 24FF0000 | 24F00000 | 24E00000 | 24D20000 |

| | | | | | | | |
|---|---|---|---|---|---|---|---|
| 000025CA | 000025B3 | 0000259C | 00002585 | 00002575 | 0000255C | 0000254D | 000001FE |
| 0000267E | 00002665 | 00002652 | 0000263B | 00002622 | 00002609 | 000025F2 | 000025DE |
| 0000272F | 00002712 | 00002703 | 000026ED | 000026D7 | 000026C2 | 000026AA | 00002693 |
| 00000014 | 00000000 | 07180006 | 0000278A | 0000277A | 0000276B | 0000275B | 0000274C |
| 00000091 | 00000082 | 00000072 | 0000005C | 00000050 | 00000042 | 00000031 | 00000027 |
| 00000110 | 00000105 | 000000FA | 000000E6 | 000000D5 | 000000BF | 000000B1 | 000000A4 |
| 00000192 | 0000017C | 00000169 | 00000154 | 00000149 | 0000013E | 00000130 | 0000011D |
| 00000201 | 000001F6 | 000001E1 | 000001D5 | 000001CA | 000001BC | 000001B2 | 0000019F |
| 0000028D | 00000277 | 00000265 | 00000256 | 00000245 | 0000022F | 00000222 | 0000020D |
| 00000303 | 000002F9 | 000002E8 | 000002D8 | 000002C6 | 000002BA | 000002AC | 000002A2 |
| 00000376 | 00000361 | 00000356 | 0000034C | 00000341 | 00000336 | 00000327 | 00000315 |
| 000003F0 | 000003DD | 000003CA | 000003BE | 000003B4 | 000003A8 | 00000393 | 00000387 |
| 00000469 | 0000045D | 00000453 | 00000447 | 00000435 | 0000041F | 0000040E | 00000403 |
| 000004D4 | 000004C8 | 000004B7 | 000004AC | 000004A2 | 00000497 | 00000485 | 0000047C |
| 00000563 | 00000553 | 0000053E | 00000534 | 00000521 | 0000050B | 000004FA | 000004E5 |
| 000005C1 | 000005B6 | 000005AA | 000005A0 | 00000595 | 0000058A | 0000057F | 00000571 |

| | | | | | | | |
|---|---|---|---|---|---|---|---|
| 06260000 | 06190000 | 060D0000 | 06010000 | 05F60000 | 05E90000 | 05DA0000 | 05CD01FE |
| 069C0000 | 068F0000 | 06840000 | 06760000 | 06640000 | 06560000 | 06400000 | 06300000 |
| 07020000 | 06F30000 | 06E60000 | 06D40000 | 06C80000 | 06BD0000 | 06B10000 | 06A70000 |
| 07670000 | 075C0000 | 07510000 | 07420000 | 07380000 | 072C0000 | 07210000 | 07150000 |
| 07CC0000 | 07BF0000 | 07B20000 | 07A80000 | 079E0000 | 07920000 | 07820000 | 07760000 |
| 08520000 | 08460000 | 08300000 | 081B0000 | 08110000 | 07FC0000 | 07F00000 | 07DF0000 |
| 08DE0000 | 08CF0000 | 08BF0000 | 08AA0000 | 08980000 | 08860000 | 08710000 | 08600000 |
| 09540000 | 09470000 | 093C0000 | 09310000 | 091A0000 | 090E0000 | 08F70000 | 08EC0000 |
| 09DE0000 | 09D10000 | 09BB0000 | 09A60000 | 099A0000 | 09870000 | 09780000 | 09610000 |
| 0A680000 | 0A5C0000 | 0A500000 | 0A3B0000 | 0A2E0000 | 0A1A0000 | 0A050000 | 09F10000 |
| 0AE70000 | 0AD20000 | 0ABC0000 | 0AB20000 | 0A9D0000 | 0A910000 | 0A840000 | 0A730000 |
| 0B540000 | 0B420000 | 0B370000 | 0B290000 | 0B170000 | 0B0B0000 | 0B000000 | 0AF40000 |
| 0BBB0000 | 0BAD0000 | 0BA00000 | 0B930000 | 0B880000 | 0B7D0000 | 0B710000 | 0B660000 |
| 0C470000 | 0C310000 | 0C1C0000 | 0C100000 | 0BFB0000 | 0BEE0000 | 0BDA0000 | 0BC70000 |
| 0CBE0000 | 0CB10000 | 0CA10000 | 0C930000 | 0C7F0000 | 0C6F0000 | 0C610000 | 0C540000 |
| 0D2E0000 | 0D230000 | 0D150000 | 0D090000 | 0CFD0000 | 0CEC0000 | 0CDF0000 | 0CCD0000 |

00000DB3 00000DA3 00000D8D 00000D7B 00000D6A 00000D57 00000D3C 000001FE
00000E48 00000E31 00000E21 00000E0B 00000DFB 00000DEC 00000DDA 00000DC5
00000ECA 00000EB9 00000EAA 00000E95 00000E84 00000E79 00000E68 00000E57
00000F68 00000F53 00000F3E 00000F29 00000F17 00000F00 00000EE9 00000EDB
00000FE5 00000FDA 00000FC4 00000FB6 00000FA8 00000F97 00000F89 00000F7B
00001078 00001064 0000104D 00001038 00001023 0000100C 00001001 00000FF5
00001106 000010F8 000010EB 000010DE 000010C9 000010B4 000010A1 0000108D
000011A5 00001194 00001179 0000115E 0000114A 00001135 0000112A 00001114
0000122F 0000121C 0000120E 00001200 000011EE 000011DC 000011C6 000011B1
000012B3 000012A7 0000129A 0000128E 00001282 0000126E 0000125A 00001244
0000134B 00001336 00001329 00001314 000012FF 000012F3 000012DE 000012C8
000013E9 000013D4 000013C8 000013B2 0000139D 00001388 00001374 00001361
00001482 0000146C 00001458 00001445 0000142F 0000141A 0000140E 000013FE
0000150D 00001503 000014F4 000014E8 000014D3 000014BE 000014AA 00001497
00001588 00001577 00001563 00001557 00001541 00001533 00001526 0000151A
000015E2 000015D7 000015CC 000015C0 000015B4 000015AA 0000159F 00001592

16450000 16370000 16290000 161D0000 16100000 16050000 15F90000 15ED0194
16A10000 16960000 168C0000 16820000 16740000 16680000 165B0000 16510000
16F50000 16EA0000 16E00000 16D60000 16CC0000 16C10000 16B70000 16AC0000
17530000 17460000 173A0000 172F0000 17250000 17180000 170B0000 17000000
17AB0000 17A00000 17950000 178A0000 177E0000 17730000 17680000 175D0000
17FF0000 17F50000 17EB0000 17E10000 17D60000 17CB0000 17C10000 17B70000
18580000 184C0000 18400000 18340000 182A0000 181F0000 18150000 180A0000
18CC0000 18BE0000 18AF0000 18A10000 18920000 18840000 18750000 18670000
19340000 19270000 191A0000 190D0000 19000000 18F30000 18E60000 18D90000
19AA0000 199C0000 198E0000 19800000 19720000 195B0000 194E0000 19410000
1A1A0000 1A0C0000 19FE0000 19F00000 19E20000 19D40000 19C60000 19B80000
1A8A0000 1A7C0000 1A6E0000 1A600000 1A520000 1A440000 1A360000 1A280000
067400FA 7E83FE46 FFFF0000 1ACC0000 1ABF0000 1AB20000 1AA50000 1A980000
9A50FA46 8D16FE76 FFFC76FF F676FFF8 76FF0E75 FF127EC5 57560088 E9FA468B
FE9A50FA 468D16FF 6AFE76FF 0E75FF12 7EC55756 D47500FA 7E835E5F 0014D228
00FA7E83 5E5F0014 99EC9A50 FA468D16 FE76FF57 56B57500 FA7E835E 5F0014D1

APPENDIX B

Dump of file U$PLOT:[YACOV.V4.SUBSYSTEM.PATENT.SRC]TEST.OUT;2
on 18-FEB-1990 14:27:14.89
File ID (36,15,0)   End of file block 121 / Allocated 123

Virtual block 512 (0200) bytes 66490000 86900000 0A500000 001C0000 D0330000 11640000 A7CF00B9 020601FE
04000000 01A00000 08000000 00000000 00000000 00000000 00000000 0000086F
00000000 00000000 00000000 00000000 00000000 00140000 02010000 00400000
00000000 00000000 00000000 00000000 000FFFF0 00001000 00030000 00000000
00000000 00000000 00000000 00000000 00000000 00000000 00000000 00000000
45505041 4D203638 32585041 69143230 3A38313A 34313039 2F38312F 32300000
00000000 000D7200 00000200 008A9C00 00000F00 01CC5A7F F4322E33 56202C52
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

| | | | | | | | |
|---|---|---|---|---|---|---|---|
| 00000000 | 00000000 | 00000000 | 00000000 | 00000000 | 00000000 | 00000000 | 000001FE |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 11640000 | 9A000000 | A73C0000 | 92000000 | 003F0000 | 00000000 | 00000000 | 000001FE |
| 001C0000 | 9A000000 | 00230000 | 9A000000 | 00540000 | 92000000 | D02D0000 | 92000000 |
| 00000000 | 00000000 | 00000000 | 00000000 | 00000000 | 00000000 | 00000000 | 9A000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00000000 | 00000000 | 00000000 | 000001FE |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

| | | | | | | | |
|---|---|---|---|---|---|---|---|
| 00000000 | 00000000 | 00000000 | 00000000 | 00010000 | 00000000 | 00000000 | 000001FE |
| 00000000 | 00000000 | 00000000 | 00000000 | 00020000 | 00000000 | 00000000 | 00000000 |
| 00000000 | A73D0000 | A73C0000 | 0C000000 | 00148008 | 00010000 | 00000000 | 00000000 |
| 00000000 | 11650000 | 11640000 | B4000000 | 001C8000 | 00020000 | 00000000 | 00000000 |
| 00000000 | D02E0000 | 00000000 | 00000000 | 00248000 | 00020000 | 00000000 | 00000000 |
| 00000000 | 00550000 | 00540000 | C8000000 | 002C8008 | 00010000 | 00000000 | 00000000 |
| 00000000 | 00240000 | 00230000 | CC000000 | 00348008 | 00010000 | 00000000 | 00000000 |
| 00000000 | 001D0000 | 001C0000 | D0000000 | 003C8008 | 00010000 | 00000000 | 00000000 |
| 00000000 | 002C0000 | 002C0000 | D01C0000 | 00090000 | 00410000 | 00000000 | 00000000 |
| 00000000 | 0A500000 | 0A500000 | D0480000 | 000A0000 | 00420000 | 00000000 | 00000000 |
| 00000000 | 005A0000 | 005A0000 | DA980000 | 000B0000 | 00430000 | 00000000 | 00000000 |
| 00000000 | 001C0000 | 001C0000 | DAF20000 | 000C0000 | 00440000 | 00000000 | 00000000 |
| 00000000 | 15640000 | 15640000 | DB0E0000 | 000D0000 | 00450000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |
| 00000000 | 00000000 | 00000000 | 00000000 | 00000000 | 00000000 | 00000000 | 00000000 |

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

3EC52E14 3436FF2E 143636FF 2EEC8B55 57560000 00000000 00000000 000001FE
C4830014 8CC39A35 FF0275FF 14303EC5 2E08C483 00145B1C 9A35FF02 75FF1430
0A76FF0C 76FF6474 003D8314 383EC52E 0000EA46 C7000016 C85756CB 5E5FC904
EC468D16 50EA468D 160CC483 00145B38 9A50EC46 8D16143C 36FF2E14 3E36FF2E
6A056A35 FF14443E C52E35FF 14483EC5 2E50EC46 8D165004 C4830014 A6949A50
76FF34EB 16C48300 14A04A9A 35FF3DC5 14403EC5 2E0275FF 3DC51440 3EC52E0B
0CC48300 145B1C9A 35FF0275 FF14303E C52E144C 36FF2E14 4E36FF2E 0A76FF0C
5236FF2E 00000CC8 5756CB5E 5FC904C4 8300148C C39A35FF 0275FF14 303EC52E
9A50F446 8D1650F6 468D1657 5608C483 0014A2E6 9A50F646 8D161450 36FF2E14
5A36FF2E 145C36FF 2E145E36 FF2E2075 FFFF3D05 8914543E C52E5E5F 00147136
16006A03 6A35FF14 543EC52E 575608C4 8300145B 1C9A5000 24051458 068B2E14
126A1460 36FF2E14 6236FF2E 35FF1454 3EC52E57 565E5F00 1471169A 50F4468D
146436FF 2E146636 FF2E1468 36FF2E14 6A36FF2E 5E5F0014 70F69A50 F4468D16
146C36FF 2E146E36 FF2E2075 C20B0255 89058914 303EC52E 08C48300 148A609A
9A50F446 8D16006A 575608C4 8300145B 1C9A5000 24051458 068B2E14 5A36FF2E
36FF2E14 7436FF2E 147636FF 2E207400 F47E8305 8914703E C52E5E5F 0014729C

56000002 C85756CB 5E5FC908 C4830014 5B1C9A50 00240514 58068B2E 145A01FE
468D1635 FF14543E C52E5756 5E5F0014 71569A50 FE468D16 35FF1454 3EC52E57
5FC95E5F 0014727C 9A50FE46 8D1635FF 14703EC5 2E57565E 5F001471 769A50FE
50FF468D 1635FF14 543EC52E 57562D75 003D8314 783EC52E 000004C8 5756CB5E
563DEBC0 2B047400 FC7E835E 5F001474 FC9A50FC 468D1635 FF14703E C52E016A
7E835E5F 0014751C 9A50FC46 8D160A76 FF35FF14 703EC52E 35FF1454 3EC52E57
CB5E5FC9 98FF468A 000005C7 14783EC5 2ECCEB00 0105C714 783EC52E 0B7400FC
80E7751B FF7E8006 74C00B98 FF468802 C4830014 02529A0A 76FF0000 02C85756
4FFF7E80 0674C00B 98FF4688 02C48300 1402529A 0A76FF3E EBC02B04 7500FF7E
B8C6EB07 7400533D 07740050 3D02C483 00140252 9A0A76FF DD7400FF 7E80E775
0375003D 8314383E C52E0000 FE46C700 0002C857 56CB5E5F C90004B8 03EB0001
1604C483 00140037 9A35FF14 7C3EC52E 50E42A05 8A0A7E03 14803EC5 2E0202E9
056A35FF 14443EC5 2E35FF14 483EC52E 148436FF 2E148636 FF2E046A 50FE468D
468D1616 C4830014 A04A9A35 FF3DC514 403EC52E 0275FF3D C514403E C52E0B6A
C52E35FF 14483EC5 2E0C76FF 0E76FF50 04C48300 14A6949A 0C76FF0E 76FF50FE
14A04A9A 35FF3DC5 14403EC5 2E0275FF 3DC51440 3EC52E0B 6A056A35 FF14443E

C52E35FF 14483EC5 2E148836 FF2E148A 36FF2E04 6A50FE46 8D1616C4 830001FE
14A04A9A 35FF3DC5 14403EC5 2E0275FF 3DC51440 3EC52E0B 6A056A35 FF14443E
803EC52E 05880A7E 03148C3E C52E04C4 830014A6 949A0C76 FF0E76FF 16C48300
6A50FE46 8D1604C4 83001400 379A5040 058B147C 3EC52E50 E42A058A 0A7E0314
3EC52E0B 6A056A35 FF14443E C52E35FF 14483EC5 2E149036 FF2E1492 36FF2E04
20751046 0B12468B 16C48300 14A04A9A 35FF3DC5 14403EC5 2E0275FF 3DC51440
1AEB1494 36FF2E14 9636FF2E 5004C483 0014A694 9A0C76FF 0E76FF50 FE468D16
FF14483E C52E1076 FF1276FF 5004C483 0014A694 9A1076FF 1276FF50 FE468D16
9A35FF3D C514403E C52E0275 FF3DC514 403EC52E 0B6A056A 35FF1444 3EC52E35
2E35FF14 483EC52E 149836FF 2E149A36 FF2E046A 50FE468D 1616C483 0014A04A
A04A9A35 FF3DC514 403EC52E 0275FF3D C514403E C52E0B6A 056A35FF 14443EC5
FF14303E C52E0A76 FF0C76FF 0E76FF14 9C36FF2E 149E36FF 2E25EB16 C4830014
00008A46 C7000094 46C70000 7AC85756 CB5E5FC9 0EC48300 148ED69A 35FF0275
94468D16 0198E903 75003D83 14383EC5 2E0014A3 869A0000 8646C700 008846C7
3EC52E02 75FF3DC5 14403EC5 2E686A04 6A35FF14 443EC52E 196A50FF 468D1650
86468B8A 46898846 8B0081E9 037400FF 7E8014C4 830014A0 4A9A35FF 3DC51440
```

403EC52E 696A046A 35FF1444 3EC52E05 6A508646 8D165094 468D1688 468901FE
FF71E903 744F887E 8314C483 0014A04A 9A35FF3D C514403E C52E0275 FF3DC514
2E0291E9 0001B8FF 58E90974 00513D08 7400503D 86468BFF 68E90374 1B8A7E83
3DE42AFF 468A0276 E90004B8 000005C7 14A43EC5 2E000308 45C73DC5 14A03EC5
14741C9A 5094468D 16509046 8D16006A 35FF14A8 3EC52E57 5600E4E9 037400FF
9276FF02 31E90014 A3D89A08 7400947E 83FF02E9 03750194 7E839246 895E5F00
FED1E903 7400013D 08740003 3D058B8C 7EC58E56 898C4689 02C48300 14A7029A
0ED29A00 0005C714 A43EC52E 0845893D C514A03E C52E058B 8C7EC500 14A3D89A
0014739C 9A509446 8D16016A 9076FF57 5601C3E9 03740001 3D058B8C 7EC50014
5E5F0014 727C9A50 94468D16 35FF14A8 3EC52E57 5601C3E9 03740094 7E835E5F
02C48300 1402D09A 196A019A E90005B8 5E5F0014 72DC9A50 94468D16 006A5756
FF7E8001 3FE90375 003D8314 383EC52E 0014A3D8 9AFF1CE9 0375C00B 98FE4688
3EC52E69 6A046A35 FF14443E C52E706A 5096468D 16509446 8D160168 E9037407
36FF2E50 94468D16 14C48300 14A04A9A 35FF3DC5 14403EC5 2E0275FF 3DC51440
403EC52E 0275FF3D C514403E C52E516A 036A35FF 14443EC5 2E14AC36 FF2E14AE
443EC52E 14AC36FF 2E14AE36 FF2E5094 468D1612 C4830014 A04A9A35 FF3DC514

14A04A9A 35FF3DC5 14403EC5 2E0275FF 3DC51440 3EC52E50 6A036A35 FF1401FE
36F72ED2 2BFDAB05 9C468BFA 46894014 B036F72E D22BFFEA 059A468B 12C48300
8A14803E C52E0096 E90374FC 463B4005 8B0B7405 3B147C3E C52EFC46 894014B2
3BFFFF05 C603E42A 01458A14 8C3EC52E F08BE42A 01458A1E 77FA463B E42A0145
5077FA46 3BE42A04 458A1480 3EC52E5F 74003D83 14B43EC5 2EFDD4E9 0372FA46
7E80FDA3 E93572FA 463BFFFF 05C603E4 2A04458A 148C3EC5 2EF08BE4 2A04458A
5094468D 16016A90 76FF5756 FD8DE921 74003D83 14B43EC5 2EFD94E9 037501FE
00140000 9AEC8B55 5756CB5E 5FC9C02B FE62E903 7500947E 835E5F00 14739C9A
35FF0275 FF14303E C52E14B8 36FF2E14 BA36FF2E 04C48300 1400379A 096A146A
BE36FF2E 0A6A04C4 8300148C C39A35FF 0275FF14 303EC52E 08C48300 145B1C9A
0275FF14 303EC52E 0AC48300 145B1C9A 35FF0275 FF14303E C52E14BC 36FF2E14
1C9A35FF 0275FF14 303EC52E 14C036FF 2E14C236 FF2E04C4 8300148C C39A35FF
2E14C636 FF2E0C6A 04C48300 148CC39A 35FF0275 FF14303E C52E08C4 8300145B
35FF0275 FF14303E C52E0AC4 8300145B 1C9A35FF 0275FF14 303EC52E 14C436FF
1C9A35FF 0275FF14 303EC52E 14C836FF 2E14CA36 FF2E0D6A 04C48300 148CC39A
36FF2E14 CE36FF2E 04C48300 148CC39A 35FF0275 FF14303E C52E0AC4 8300145B

35FF0275 FF14303E C52E08C4 8300145B 1C9A35FF 0275FF14 303EC52E 14CC01FE
145B1C9A 35FF0275 FF14303E C52E14D0 36FF2E14 D236FF2E 04C48300 148CC39A
14D436FF 2E14D636 FF2E04C4 8300148C C39A35FF 0275FF14 303EC52E 08C48300
148CC39A 35FF0275 FF14303E C52E08C4 8300145B 1C9A35FF 0275FF14 303EC52E
C70000D4 46C70000 42C85756 CB5E5FC9 04C48300 1400379A 166A026A 04C48300
0401E903 75003D83 14383EC5 2E0000BE 46C70001 CE46C700 00D046C7 0000D246
36FF2E14 DC36FF2E 14DE36FF 2EC04689 5E5F0014 73FC9A50 BE468D16 006A5756
FF2E14E2 36FF2E14 E436FF2E 14E636FF 2E08C483 00149FD7 9A14D836 FF2E14DA
16025589 05891440 3EC52E14 E2168B2E 14E0068B 2E08C483 00149FD7 9A14E036
C514403E C52E0275 FF3DC500 6A036AC0 76FF1444 36FF2E14 4636FF2E 50BE468D
CDF546C7 00FAF146 C7038FE9 0001B806 7400BE7E 8312C483 0014A04A 9A35FF3D
46C600FD 46C600FC 46C601FB 46C602FA 46C606F9 46C60005 05C7147C 3EC52E00
D076FFCE 76FF50FE 468D1650 BE468D16 0014F746 C70002F3 46C704F0 46C604FE
4A9A35FF 3DC51440 3EC52E02 75FF3DC5 14403EC5 2E026A05 6A35FF14 443EC52E
46C704F0 46C604FE 46C60589 14E83EC5 2EEE468B 857500BE 7E8316C4 830014A0
3EC52ED0 76FFCE76 FF50EE46 8D1650BE 468D1600 14F746C7 00BAF546 C70002F3

A04A9A35 FF3DC514 403EC52E 0275FF3D C514403E C52E026A 056A35FF 144401FE
00D746C6 01D646C6 058914EC 3EC52EEE 468BFF25 E9037400 BE7E8316 C4830014
3DC51440 3EC52E52 6A036A35 FF14443E C52E50D6 468D1650 BE468D16 02D846C6
F546C7FE D6E90374 00BE7E83 12C48300 14A04A9A 35FF3DC5 14403EC5 2E0275FF
76FF50EE 468D1650 BE468D16 000AF346 C703F046 C601FE46 C60062F7 46C700CD
3DC51440 3EC52E02 75FF3DC5 14403EC5 2E026A05 6A35FF14 443EC52E D076FFCE
3EC52E05 8914483E C52EEE46 8BFE80E9 037400BE 7E8316C4 830014A0 4A9A35FF
C514403E C52E506A 036A35FF 14443EC5 2E5714AE 36FF2E50 BE468D16 058914AC
160242C4 46C70016 C246C712 C4830014 A04A9A35 FF3DC514 403EC52E 0275FF3D
6A066A35 FF14443E C52E35FF 14E83EC5 2ED476FF D276FF50 C2468D16 50BE468D
00BE7E83 18C48300 14A04A9A 35FF3DC5 14403EC5 2E0275FF 3DC51440 3EC52E06
FF14483E C52ED476 FFD276FF 50C2468D 1650BE46 8D160255 C446C7FD EEE90374
9A35FF3D C514403E C52E0275 FF3DC514 403EC52E 066A066A 35FF1444 3EC52E35
1650BE46 8D160271 C446C700 1FC246C7 FDA3E903 7400BE7E 8318C483 0014A04A
403EC52E 066A066A 35FF1444 3EC52E35 FF14EC3E C52ED476 FFD276FF 50C2468D
FD53E903 7400BE7E 8318C483 0014A04A 9A35FF3D C514403E C52E0275 FF3DC514

FF14443E C52E35FF 14EC3EC5 2E14F036 FF2E14F2 36FF2E06 6A50BE46 8D1601FE
16C48300 14A04A9A 35FF3DC5 14403EC5 2E0275FF 3DC51440 3EC52E0B 6A056A35
6A35FF14 443EC52E 35FF14EC 3EC52E14 F436FF2E 14F636FF 2E046A50 BE468D16
8D1616C4 830014A0 4A9A35FF 3DC51440 3EC52E02 75FF3DC5 14403EC5 2E0B6A05
6A056A35 FF14443E C52E35FF 14483EC5 2E14F836 FF2E14FA 36FF2E05 6A50BE46
00BE7E83 16C48300 14A04A9A 35FF3DC5 14403EC5 2E0275FF 3DC51440 3EC52E0B
8F4F9A35 FF0275FF 14303EC5 2E000005 C714783E C52E0014 00E89AFC 90E92874
3D831438 3EC52E00 00FE46C7 000002C8 5756CB5E 5FC90014 08E09A04 C4830014
3EC52E07 6A026A35 FF14443E C52E35FF 14E83EC5 2E50FE46 8D1600BD E9037500
3EC52E50 FE468D16 10C48300 14A04A9A 35FF3DC5 14403EC5 2E0275FF 3DC51440
3DC51440 3EC52E02 75FF3DC5 14403EC5 2E076A02 6A35FF14 443EC52E 35FF14EC
C514403E C52E016A 016A35FF 14443EC5 2E50FE46 8D1610C4 830014A0 4A9A35FF
E03EC52E 35FF14E4 3EC52E0E C4830014 A04A9A35 FF3DC514 403EC52E 0275FF3D
C4830014 9FAA9A35 FF14D83E C52E35FF 14DC3EC5 2E04C483 00149FAA 9A35FF14
739C9A50 FE468D16 016A35FF 57561274 003D8314 FC3EC52E 00140209 9A05EB04
C52E0589 14B43EC5 2E0A468B 0000FF60 86C70000 A0C85756 CB5E5FC9 5E5F0014

36FF2E00 140A7C9A 04C48300 146B439A 50FF6086 8D160E75 003D8314 383E01FE
14B43EC5 2E0AC483 0014033B 9A016A15 0036FF2E 150236FF 2E150436 FF2E1506
0014033B 9A046A15 0836FF2E 150A36FF 2E150C36 FF2E150E 36FF2E1E 74003D83
FF2E1512 36FF2E00 6A575600 14A3869A 00008C46 C78E4689 0014677F 9A0AC483
76FF5756 567501FF 60BE8390 46895E5F 0014745C 9A50FF60 868D1600 6A151036
60BE8392 46895E5F 0014745C 9A50FF60 868D1600 6A151436 FF2E1516 36FF2E8C
6086C708 758E463B 058B987E C59A5689 98468902 C4830014 A7029A50 2E7500FF
7BE90374 00FF60BE 830014A3 D89A87EB 5057568C 4689058B 987EC50D EB0001FF
05520099 E9037500 107D8094 7EC59656 89944689 02C48300 14A7029A 9076FF01
50FF6086 8D164874 003D8314 383EC52E 08C48300 14A6629A 509C468D 16500010
FF14443E C52E35FF 14E83EC5 2E509C46 8D165004 C4830014 A6949A50 9C468D16
16C48300 14A04A9A 35FF3DC5 14403EC5 2E0275FF 3DC51440 3EC52E0B 6A056A35
5B1C9A35 FF0275FF 14303EC5 2E509C46 8D1604C4 83001400 379A0A6A 156A35EB
E9037500 3D80947E C504C483 00148CC3 9A35FF02 75FF1430 3EC52E08 C4830014
3EC52E0C C4830014 5B389A50 9C468D16 151836FF 2E151A36 FF2E5796 76FF00BA
949A509C 468D1650 FF60868D 1604C483 00140037 9A016A01 6A547400 3D831438

0B6A056A 35FF1444 3EC52E35 FF14483E C52E509C 468D1650 04C48300 14A601FE
6A156A41 EB16C483 0014A04A 9A35FF3D C514403E C52E0275 FF3DC514 403EC52E
08C48300 145B1C9A 35FF0275 FF14303E C52E509C 468D1604 C4830014 00379A0C
C52E04C4 83001400 379A166A 026A04C4 8300148C C39A35FF 0275FF14 303EC52E
151C0EDC 2E9B0474 DA269B05 DB9B3DC5 35C414A0 3EC52EFF 62868905 8B14A43E
81E90375 003D8314 383EC52E 058914A4 3EC52E08 C4830014 87BF9A00 14875F9A
DEE90375 053BFF62 868B14A4 3EC52E00 1305C704 7C00143D 058B14A4 3EC52E00
8B14A43E C52E50FF 60868D16 5E5F003C 00029A19 6A206A50 FF64868D 16575600
FF14443E C52E35FF 14EC3EC5 2E505200 9C2DFF62 86035A16 C58B50FF 62862B05
16C48300 14A04A9A 35FF3DC5 14403EC5 2E0275FF 3DC51440 3EC52E0B 6A056A35
8B14A436 C42E5E5F 003C0002 9A35FF14 A43EC52E 206A50FF 64868D16 57567DEB
15243EC5 2E152836 FF2E152A 36FF2E50 FF64868D 1600FF64 85C63C03 261F16FD
2E04C483 00148CC3 9A35FF02 75FF1524 3EC52E0C C4830014 5B1C9A35 FF0275FF
9B04C483 00146BA4 9A50FF60 868D1604 C4830014 8D2A9A35 FF0275FF 14303EC5
FE7E8306 7404FE7E 830C7400 013DFE46 89001405 7E9A0000 04C85756 CB5E5FC9
C514A03E C52F0014 0ED29A00 000845C7 3DC5152C 3EC52E57 7501FE7E 83E77505

6A006A00 6A006A5E 5F001474 9C9A50FC 468D1605 00685756 00010A45 C73D01FE
830014A7 1E9A1717 6810C483 0014643F 9A153036 FF2E1532 36FF2E00 6A006A00
03EF001C 0EC8001C 03EA001C 06F000C8 5E5FC900 140ED29A 057504FE 7E8302C4
0408001C 0BBE001C 0692001C 0401001C 03F8001C 06F6001C 0726001C 0700001C
06F8001C 0724001C 045D001C 0722001C 0440001C 043E001C 0437001C 0424001C
0499001C 0494001C 048B001C 0486001C 06B0001C 0481001C 047C001C 06AA001C
04C4001C 049A001C 06FA000E 0009001C 0704001C 0EC4001C 0ECA001C 0EC0001C
072A001C 0728001C 05FB001C 05C8001C 058C001C 055A001C 0528001C 04F6001C
0EC6001C 063C001C 0637001C 0630001C 072C001C 06F4001C 06FE001C 06FC001C
0000001C 0666001C 069E001C 0694001C 065D001C 0654001C 064B001C 0642001C
00FE46C7 000006C8 5756001C 0682001C 0EBC001C 066F001C 0ECC4034 00000000
98E90375 0C4623E0 D3FC4E8B 0001B800 AEE9037C 0A463BFC 468B0000 FC46C700
5E8E0E7E 03F88B24 FA466BE6 D1FC768B 0086E903 7C0100FA 7E810000 FA46C700
8B24FA46 6B357602 3D800E7E 03F88B24 FA466B43 7500FF3D E42A0545 8AFE0310
29BC068E 2E29BA36 032E02E6 C1FE768B E42A0445 8AFE030E 7E03E7D1 FC7E8BF0
29BC068E 2E29BA36 032E02E6 C1FE768B 20EB0589 025C8E26 3C0326E7 D1FA7E8B

47E9FC46 FFFE46FF FF70E9FA 46FFFFFF 05C7025C 8E263C03 26E7D1FA 7E8B01FE
8E263C03 26FC7E8B 29BE36C4 2E0000FC 46C70A4E FF00000E C85756CB 5E5FC9FF
058A0C46 FF0C7EC5 010BE903 7210463B FA468B00 00FA46C7 FE468998 058A025C
89058B14 5E8E127E 03E7D1F8 7E8BF846 89E42A05 8A0C46FF 0C7E8BF6 4689E42A
037FFE46 3BF6468B 367400F2 7E83F246 89C02B02 EB0001B8 057D00F4 7E83F446
26FC7E8B FC46FF29 BE36C42E F64629FE 468B00A9 E903720A 463BFC46 8B00B4E9
7E8B4773 0A463BFC 468B4F7E FE463BF6 468BCAEB FE468998 058A025C 8E263C03
F64629FE 468B0255 11050199 C68BF08B FE6EF7F4 468B185E 8E167E03 02E7C1FC
98058A02 5C8E263C 0326FC7E 8BFC46FF 29BE36C4 2E05001C 5E8E1A7E 03FC7E8B
8BF66EF7 F4468B18 5E8E167E 0302E7C1 FC7E8B30 730A463B FC468BA9 EBFE4689
FA46FFFE 4629F646 8B0500F6 468B1C5E 8E1A7E03 FC7E8B02 55110501 99C68BF0
FE7E8B00 FBE9037C 22463BFE 468B0000 FE46C700 0006C857 56CB5E5F C9FEEAE9
5E8E0A7E 03FE7E8B E42A058A 105E8E0E 7E03FE7E 8B197500 3D80185E 8E167E03
5E8E167E 03FE7E8B FC5689FA 468999E4 2A058A1C 5E8E1A7E 03FE7E8B 00CCE90C
058A105E 8E0E7E03 FE7E8B00 05C6167E 03FE7E8B FC5619FA 462999E4 2A058A18
0302E7C1 FE7E8BFC 5689FA46 8908C483 001488B4 9AFA76FF FC76FF50 5299E42A

C7000005 C7127E03 02E7C1FE 7E8BFC56 11FA4601 02558B05 8B145E8E 127E01FE
205E8E1E 7E03E7D1 F88B9805 8A025C8E 263C0326 FE7E8B29 C236C42E 00000245
8E0A7E03 FE7E8BFC 5689FA46 8908C483 001488B4 9AFA76FF FC76FF50 5299058B
5756CB5E 5FC9FEFA E9FE46FF 0588FAE2 D8D1FAD1 06E30C8B 2629C636 C42E0C5E
568B2C56 0129D23E F72E992C 468B0003 05C729CA 3EC52E00 00E846C7 00002CC8
BE3EC52E 02C48300 14A23E9A 2C76FFEE 46892A6E F72C468B 158929CE 3EC52E2C
3E9A2C76 FF025589 058929D4 3EC52E02 C4830014 A23E9A2C 76FF0255 89058929
C23EC52E 02C48300 14A23E9A 2C76FF06 55890445 8929D43E C52E02C4 830014A2
557D043B 26058B29 D83EC52E 29CA36C4 2E000005 C729D83E C52E0255 89058929
8929DE1E 8E2E29DC 3E032E04 E7C13D8B 29D83EC5 2E02C483 0014A23E 9AEE76FF
3E032E04 E7C13D8B 29D83EC5 2E02C483 0014A23E 9A5002E0 C1EE468B 02558905
14A23E9A 5009E0C1 2A468B9A EB05FF29 D83EC52E 02558905 8929E21E 8E2E29E0
D83EC52E 29CA36C4 2E000005 C729D83E C52E0255 89058929 BA3EC52E 02C48300
C14AF456 8B00BCE9 037C2A46 3BF4468B 0001F446 C700D6E9 037C043B 26058B29
0403262C 468BF103 29DE068E 2E29DC36 032E04E6 C1358B29 D83EC52E CA8B02E2
02558905 89FE0329 DE1E8E2E 29DC3E03 2E04E7C1 3D8B02E6 C1F4768B 02548B26

0329E206 8E2E29E0 36032E04 E6C1358B 29D83EC5 2ECA8B02 E2C14AF4 568B01FE
8E2E29E0 3E032E04 E7C13D8B 02E6C1F4 768B0254 8B260403 2602E0C1 2C468BF1
02558B05 8B29BC1E 8E2E29BA 3E032E02 E7C14FF4 7E8B0255 890589FE 0329E21E
05FF29D8 3EC52EFF 39E9F446 FF025589 058929BA 3E032E02 E7C1F47E 8B020005
9B1DD99B 29E43EC5 2E1276DC 9B0A46DD 9BF85ED9 9B2276DC 9B1A46DD 9BFF16E9
F6468908 C4830014 87BF9A00 14875F9A 08C48300 14A6BC9A 0014875F 9AF846D9
83001487 BF9A0014 875F9A08 C4830014 A6BC9A00 14875F9A 05D99B29 E43EC52E
0129E903 7C2C463B F2468B00 00F246C7 FC5ED99B EED99B05 8929E83E C52E08C4
875F9A08 C4830014 A6BC9A00 14875F9A FC46D99B FC5ED99B FC46D89B F846D99B
C42E0588 025C8E26 3C0326F2 7E8B29BE 36C42EF0 468908C4 83001487 BF9A0014
C52EFC5E D99BFC6E D89BF046 DF9B0588 F6462B02 5C8E263C 0326F27E 8B29C236
058B29E8 3EC52E05 88025C8E 263C0326 F27E8B29 D436C42E F06EF705 8B22E83E
2E29CA36 C42E0000 05C729D8 3EC52E05 88065C8E 26047C03 26F27E8B F06EF740
1EC52EC8 8B02E0C1 617D2A46 3BF4468B 0000F446 C7787D04 3B26058B 29D83EC5
0005C602 5C8E263C 0326F27E 8BF10329 DE068E2E 29DC3603 2E04E6C1 378B29D8
7E8BF103 29E2068E 2E29E036 032E04E6 C1378B29 DA1E8E2E C88B02E0 C1F4468B

29D83EC5 2E97EBF4 46FF0000 0245C700 0005C702 5C8E263C 032602E7 C1F201FE
468B473C 8B29E836 C52E1DD9 9B29EC3E C52EEED9 9BFECCE9 F246FFFF 77E905FF
7DF2463B E0D30D8B 0001B829 C63EC52E 000005C7 29C63EC5 2EF24689 EFF740F6
B829C636 C42EE646 89F66EF7 058B29E8 3EC52E07 058329C6 3EC52EEB EB05FF04
E646892D F740F646 8B29E83E C52E0589 29F03EC5 2EE67EF7 99E0D30C 8B260001
B8E64689 F66EF740 058B29E8 3EC52E02 458929F0 3EC52EE6 7EF799E0 D30001B8
4689EFF7 40F6468B 473C8B29 E836C52E 04458929 F03EC52E E67EF799 E0D30001
3076FF32 76FF0645 8929F03E C52EE67E F799E0D3 0C8B2600 01B829C6 368B2EE6
9A3476FF 00000245 C7000005 C729F43E C52E08C4 83001415 349A2A76 FF2E76FF
1487F59A 0014875F 9AE04EDC 9B05D99B 29E43EC5 2EE05EDD 9B02C483 00148775
9B02C483 0014876D 9A504805 8B29CA3E C52E0255 89058929 F83EC52E 08C48300
2E058929 FC3EC52E 08C48300 1487BF9A 0014875F 9AE04EDC 9BF846D9 9BE05EDD
E04EDC9B 05D99B29 E43EC52E E05EDD9B 02C48300 14876D9A 5048058B 29CA3EC5
2E02C483 0014A23E 9AF00C68 05892A00 3EC52E08 C4830014 87BF9A00 14875F9A
02558B05 8B2A043E C52E0255 8905892A 083EC52E 28000502 55890589 2A043EC5
892A103E C52E7800 0502558B 058B2A04 3EC52E02 55890589 2A0C3EC5 2E500005

3EC52E02 55890589 2A143EC5 2E60002D 02558B05 8B2A043E C52E0255 890501FE
002D0255 8B058B2A 043EC52E 02558905 892A183E C52E3800 2D02558B 058B2A04
0305C72A 243EC52E 02558905 892A203E C52E0006 05025589 05892A1C 3EC52E10
893DC52A 083EC52E FE45893D C52A103E C52EFE45 89FFFFB8 3DC52A18 3EC52E00
46D99B00 0005C72A 303EC52E 000005C7 2A2C3EC5 2E000005 C72A283E C52EFE45
8908C483 001487DA 9A001487 5F9A08C4 830014A5 DC9A0014 875F9A2C 4EDE9BF8
3EC52E05 893DC52A 043EC52E 058B29FC 3EC52EEA 46894005 8B2A003E C52EEC46
2E05893D C52A083E C52E00D2 83000105 02558B05 8B29F83E C52E0589 3DC52A20
2EC62BEC 468BE6D1 358BC62B EC468BE6 D1358B29 FC3EC52E 05893DC5 2A1C3EC5
3EC52EEA 4603058B 2A003EC5 2E024589 3DC52A20 3EC52E02 45893DC5 2A043EC5
893DC52A 043EC52E 058B29FC 3EC52E02 45893DC5 2A1C3EC5 2E024589 3DC52A08
083EC52E 00D28300 01050255 8B058B29 F83EC52E 0445893D C52A203E C52E0445
892A243E C52E0589 2A303EC5 2E0003B8 0445893D C52A1C3E C52E0445 893DC52A
000005C7 2A361E8E 2E2A343E 032EE7D1 F27E8B66 7D0100F2 7E810000 F246C705
F27E8B29 BC068E2E 29BA3603 2E02E6C1 F4768B41 7D2A463B F4468B00 00F446C7
3E032EE7 D1F27E8B EA460305 8B2A003E C52E1B7C 003D8302 5C8E263C 0326E7D1

C42E0000 05C729D8 3EC52E93 E3F246FF B7EBF446 FF05892A 361E8E2E 2A3401FE
9B29EC3E C52E05D9 9B29E43E C52E0220 E9037C04 3B26058B 29D83EC5 2E29CA36
83001487 BF9A0014 875F9A08 C4830014 A6BC9A00 14875F9A 05D99B1D D99B05D8
C52E1DD9 9B2DD89B 29EC3EC5 2EE646DF 9BE44689 052B29E8 3EC52EE6 468908C4
037CE646 3BF2468B 0000F246 C705892A 3A1E8E2E 2A383E03 2EE7D13D 8B29D83E
76FF50E0 468D1650 DE468D16 50E8468D 16000255 83010583 29F43EC5 2E01A5E9
058B2A10 3EC52EDC 5689DA46 8902558B 058B2A0C 3EC52E0E C4830014 780E9AF2
3EC52E02 558B058B 2A043EC5 2ED44689 058B2A28 3EC52ED8 5689D646 8902558B
2A303EC5 2E025589 05892A10 3EC52E02 558B058B 2A083EC5 2E025589 05892A0C
2ED8568B D6468B02 55890589 2A043EC5 2EDC568B DA468B05 892A283E C52E058B
75FF2A08 3EC52E57 2A3236FF 2E05892A 303EC52E D4468B02 55890589 2A083EC5
C52E35FF 0275FF2A 103EC52E 35FF2A28 3EC52E35 FF0275FF 2A043EC5 2E35FF02
003EC52E 35FF0275 FF2A143E C52E35FF 0275FF2A 183EC52E 35FF0275 FF2A0C3E
266C9AE0 76FFE276 FFDE76FF 2A3436FF 2E2A3636 FF2E35FF 29FC3EC5 2E35FF2A
C13D8B29 D83EC52E 02E6C1F4 768B707D 2A463BF4 468B0000 F446C72C C4830014
3D8B29D8 3EC52E02 E6C1F476 8B35FF02 75FFFE03 29DE1E8E 2E29DC3E 032E04E7

BA3E032E 02E7C1F4 7E8B35FF 0275FFFE 0329E21E 8E2E29E0 3E032E04 E7C101FE
FF14C483 00141601 9A2C76FF E076FFE2 76FFDE76 FF35FF02 75FF29BC 1E8E2E29
E8468B00 0005C729 D83EC52E FDCCE905 FF29D83E C52EFE50 E9F246FF 88EBF446
D43EC52E 04C48300 14A2CB9A 35FF0275 FF29BE3E C52EEC8B 555756CB 5E5FC99B
C4830014 A2CB9A04 75FF0675 FF29D43E C52E04C4 830014A2 CB9A35FF 0275FF29
CA36C42E 000005C7 29D83EC5 2E04C483 0014A2CB 9A35FF02 75FF29C2 3EC52E04
FF0275FF 29DE1E8E 2E29DC3E 032E04E7 C13D8B46 7D043B26 058B29D8 3EC52E29
0275FF29 E21E8E2E 29E03E03 2E04E7C1 3D8B29D8 3EC52E04 C4830014 A2CB9A35
A2CB9A35 FF0275FF 29BA3EC5 2EA9EB05 FF29D83E C52E04C4 830014A2 CB9A35FF
001CC857 56CB5E5F C904C483 0014A2CB 9A35FF02 75FF2A04 3EC52E04 C4830014
2A3A1E8E 2E2A383E 032EE7D1 3D8B29D8 3EC52E00 00EE46C7 000005C7 187EC500
032E02E0 C1FA468B 1276FF00 9AE9037C 10463BF0 468B0000 F046C7FA 4689058B
8B35FF02 75FF29D6 1E8E2E29 D43E032E 02E7C1FA 7E8B5052 29F2168B 2E29F006
35FF0275 FFFE0329 DE1E8E2E 29DC3E03 2E04E7C1 3D8B29D8 3EC52E02 E6C1F076
FF0275FF FE0329E2 1E8E2E29 E03E032E 04E7C13D 8B29D83E C52E02E6 C1F0768B
2E1AC483 00141743 9A505216 568B1446 03EE468B 50520E56 8B0C4603 EE468B35

D89B29EC 3EC52E05 D99B29E4 3EC52EFF 5BE9F046 FFEE4601 058B29CE 3EC501FE
C4830014 87BF9A00 14875F9A 08C48300 14A6BC9A 0014875F 9A05D99B 1DD99B05
3EC52E1D D99B2DD8 9B29EC3E C52EFC46 DF9BFA46 89052B29 E83EC52E FC468908
E9037CFC 463BF846 8B0000F8 46C70589 2A3A1E8E 2E2A383E 032EE7D1 3D8B29D8
72043B26 01ABE903 7E0D7C02 543B2602 558B058B 29F43EC5 2E29F836 C42E0201
50F4468D 1650F246 8D161876 FF1A76FF 00025583 01058329 F43EC52E 01A3E903
2A103EC5 2EEC5689 EA468902 558B058B 2A0C3EC5 2E0EC483 0014780E 9AF876FF
2E02558B 058B2A04 3EC52EE4 4689058B 2A283EC5 2EE85689 E6468902 558B058B
3EC52E02 55890589 2A103EC5 2E02558B 058B2A08 3EC52E02 55890589 2A0C3EC5
568BE646 8B025589 05892A04 3EC52EEC 568BEA46 8B05892A 283EC52E 058B2A30
2A083EC5 2E572A32 36FF2E05 892A303E C52EE446 8B025589 05892A08 3EC52EE8
35FF0275 FF2A103E C52E35FF 2A283EC5 2E35FF02 75FF2A04 3EC52E35 FF0275FF
C52E35FF 0275FF2A 143EC52E 35FF0275 FF2A183E C52E35FF 0275FF2A 0C3EC52E
9AF476FF F676FFF2 76FF2A34 36FF2E2A 3636FF2E 35FF29FC 3EC52E35 FF2A003E
3EC52E02 E6C1F076 8B00A6E9 037C1046 3BF0468B 0000F046 C72CC483 0014266C
C52E02E6 C1F0768B 35FF0275 FFFE0329 DE1E8E2E 29DC3E03 2E04E7C1 3D8B29D8

```
E7C1F07E 8B35FF02 75FFFE03 29E21E8E 2E29E03E 032E04E7 C13D8B29 D83E01FE
1416019A 1276FFF4 76FFF676 FFF276FF 35FF0275 FF29BC1E 8E2E29BA 3E032E02
3EC52E02 55890589 2A043EC5 2E02558B 058B2A20 3EC52E85 EBF046FF 14C48300
FF05892A 303EC52E 058B2A24 3EC52E02 55890589 2A083EC5 2E02558B 058B2A1C
CB5E5FC9 9B18468B 15893CF7 26994005 8B29D83E C52E29CA 36C42EFD F4E9F846
F64689E4 2A058A0A 46FF0A7E 8BF84689 E42A058A 0A46FF0A 7EC50000 20C85756
1A5E8E18 7E03E7D1 FC7E8B00 00FC46C7 F4468905 8B125E8E 107E03E7 D1F67E8B
0E463BFA 468B0001 FA46C705 89F4468B 1E5E8E1C 7E03E7D1 FC7E8B05 89F8468B
8BF64689 E42A058A 0A46FF0A 7E8BF846 89E42A05 8A0A46FF 0A7EC500 EBE90372
7E8B1375 053B1E5E 8E1C7E03 E7D1FC7E 8BF44689 058B125E 8E107E03 E7D1F67E
8B037CF8 463B1446 8B317500 F47E8300 99E90501 F8468B1A 5E8E187E 03E7D1FC
7E8BFC46 FF6F7E00 F87E8305 011A5E8E 187E03E7 D1FC7E8B F84629FE 4689F846
03E7D1FC 7E8B0A7C 053B1446 8B1A5E8E 187E03E7 D1FC7E8B 4DEB187E 03E7D1FC
83187E03 E7D1FC7E 8B05291A 5E8E187E 03E7D1FC 7E8BF846 01FE4689 058B187E
03E7D1FC 7E8B0589 F8468B1A 5E8E187E 03E7D1FC 7E8BFC46 FFFC4EFF 0375003D
FFB8067C 1400F27E 81F24689 40FC468B FF0AE9FA 46FF0589 F4468B1E 5E8E1C7E

FFF046C7 E44689E2 4689E046 89C02BF0 4689EE46 89EC4689 C02B0106 E9FF01FE
03E7D1EE 7E8B237F 00E27E83 00C5E903 7C28463B EC468B0B 7CF2463B EE468BFF
E07E83E8 4689058B 1E5E8E1C 7E03E7D1 EE46FFEE 7E8BE246 89058B1A 5E8E187E
5E8E247E 03E7D1EC 46FFEC7E 8BE04689 058B225E 8E207E03 E7D1EC7E 8B2C7F00
E24629E4 4689E046 8B037CE0 463BE246 8BE64EFF 037E00E6 7E83E646 89058B26
1375053B 305E8E2E 7E03E7D1 F07E8BEA 4689E646 8B037FE6 463BE846 8BE04629
5E8E2A7E 03E7D1F0 7E8BF046 FFFF4EE9 0501E446 8B2C5E8E 2A7E03E7 D1F07E8B
327EC540 F0468BFF 28E90589 EA468B30 5E8E2E7E 03E7D1F0 7E8B0589 E4468B2C
0000FC46 C70000FE 46C70000 08C85756 CB5E5FC9 C02BFEF6 E9037C14 003D0589
0326E7D1 FA7E8B2A 0436C42E 00B7E903 7C053BFA 468B2A30 3EC52E00 00FA46C7
F8468905 8B025C8E 263C0326 E7D1FA7E 8B2A0836 C42EFE46 01058B02 5C8E263C
FE463B98 058A025C 8E263C03 26FC7E8B 29BE36C4 2E0001F8 46C70574 00F87E83
98058A02 5C8E263C 0326FC46 FFFC7E8B 0588F846 8B0C5E8E 0A7E03FC 7E8B297D
8B267D0E 463BFC46 8B2E7400 F87E8334 7E00FE7E 83C07C0E 463BFC46 8BFE4629
8A025C8E 263C0326 FC46FFFC 7E8B29BE 36C42E05 88F8468B 0C5E8E0A 7E03FC7E
001C0778 001C0774 001C073E 001C072E 00CB5E5F C9FF3AE9 FA46FFFE 46299805

001C077A 001C09FC 001C09BC 001C0784 001C0764 0002001C 0762001C 078601FE
001C07A4 001C0792 001C0790 001C0A40 001C0A3C 001C076C 001C0780 001C077E
001C07BA 001C07B2 001C07B6 001C0798 001C0794 001C07A0 001C079C 001C07A8
0000FCB4 86C70006 88C85756 001C0788 001C07BC 001C07B0 001C07AE 001C07AC
9A339636 FF2E3398 36FF2E01 CE68F97C 9689F97A 86893394 168B2E33 92068B2E
509A5004 6A006A00 6A0F7400 FCB4BE83 FCB48689 0014549E 9A06C483 0014A0C2
1488969A 339A36FF 2E339C36 FF2E3396 36FF2E33 9836FF2E 666A08C4 00001492
2E33A036 FF2E5052 04C48300 1455369A 339A36FF 2E339C36 FF2E066A 0AC48300
509A35FF 046A006A 006A1074 003D8333 A23EC52E 0AC48300 1488969A 339E36FF
2E33A836 FF2EF97A B6FFF97C B6FF50F9 78868D16 0000F978 86C708C4 83001492
36FF2E33 AE36FF2E 33B036FF 2E016868 0CC48300 1434FE9A 50000305 33A6068B
16500054 05339606 8B2E3398 36FF2E12 6A0AC483 00148896 9A33AA36 FF2E33AC
9A36FF2E 339C36FF 2E50EE46 8D16026A FF6A126A 0AC48300 1488969A 50EE468D
006A1374 00EA7E83 0AC48300 1488969A 50DC468D 1650520C C4830014 58759A33
969A50CA 468D16DC 76FFDE76 FF126A0A C4830014 92509AEA 76FF046A 006A006A
6A50FD58 868D1650 F9EA868D 16FD5E96 89FD5C86 895A16CA 468D0AC4 83001488

0468046A 006A006A 006A1374 00FCB4BE 83FCB486 890AC483 00143E0C 9A0001FE
FD58868D 1650FD12 868D1650 FCBE868D 160001FD 1286C70A C4830014 92509AD9
0014561C 9A339E36 FF2E33A0 36FF2E50 FD30868D 16686A0C C4830014 42349A50
50B8468D 1650F9D6 868D1612 6A0AC483 00148896 9A50F982 868D1650 5208C483
B23EC52E 00E2E903 7500FCB6 BE80FCB6 8688E42A FD57868A 0AC48300 1488969A
006AFCBC 9689FCBA 868904C4 830014A2 899A50E4 2AFCB686 8A076A00 0105C733
14C48300 1443519A 50FD5886 8D1650FC B7868D16 F97EB6FF F980B6FF 5052006A
0014426D 9A50FD58 868D16FC B8B6FF50 FCCE868D 16FCB886 8904458B FCBABEC5
C4830014 561C9A33 9E36FF2E 33A036FF 2E50FCEC 868D1668 6AFCB486 890AC483
969A50A6 468D1650 F9D6868D 16126A0A C4830014 88969A50 F982868D 16505208
50FD5886 8D16FCAC 9ED99BFD 0486D99B FCB09ED9 9BFD0086 D99B0AC4 83001488
C52E09EB 04C48300 14A2CB9A FCBAB6FF FCBCB6FF FCB48689 04C48300 143E1F9A
9A5B74C0 0B08C483 00142DC5 9A50FA16 868D1650 FA0E868D 16000005 C733B23E
868D1650 FA34868D 160AC483 00149250 9A22B268 006A006A 006A006A 0014A416
9A50B846 8D1650A6 468D1650 FCB0868D 1650FCAC 868D1650 FA16868D 1650FA30
56CB5E5F C99B0AC4 83001492 509AD900 68006A00 6A006A00 6A1CC483 00142EF4
```

9B05D99B 33B63EC5 2EFF609E D99BEED9 9BFF649E D99BEED9 9B0000B0 C85701FE
868D1633 9A36FF2E 339C36FF 2E666AFF 689ED99B 05D99B33 BA3EC52E FF6C9ED9
B0685E5F 003C0002 9A0F6A00 6A50FF50 868D1657 560AC483 00148896 9A50FF76
8310C483 0014643F 9A33BE36 FF2E33C0 36FF2E04 6A0A6A04 6A50FF50 868D1600
9A0F6A50 FF50868D 16500003 050A468B 0C76FF57 5600A0E9 C02B0575 00FF74BE
5E5F002C 00029A0F 6A50DC46 8D1633C2 36FF2E33 C436FF2E 57565E5F 002C0002
0F6A50EC 468D1633 C636FF2E 33C836FF 2E575600 05C60375 203D8033 C23EC52E
8933CA3E C52E03E0 C1FC468B 0005C603 75203D80 33C63EC5 2E5E5F00 2C00029A
9B1E5DD9 9BFF6C86 D99B125D D99BFF60 86D99B16 5DD99B0A 7EC5FF64 86D99B05
FF6286C7 0032FE6C 86C70001 ACC85756 CB5E5FC9 9B0001B8 1A5DD99B FF6886D9
0CC48300 1458759A 339A36FF 2E339C36 FF2E0A76 FF0C76FF 026A016A 126A0000
D9026804 6A006A00 6A006A13 7400B67E 830AC483 00148896 9A50A846 8D165052
3EC52E0A C4830014 88969A50 DE468D16 A876FFAA 76FF126A 0AC48300 1492509A
58759A33 9A36FF2E 339C36FF 2E0E76FF 1076FF02 6A026A12 6A5B7400 3D8333B2
006A006A 006A1374 00A47E83 0AC48300 1488969A 5096468D 1650520C C4830014
83001488 969A50CC 468D1696 76FF9876 FF126A0A C4830014 92509AD9 0368046A

8D1650FF 62868D16 F85ED99B 05D99B22 7EC5FC5E D99B05D9 9B1E7EC5 0AC401FE
50F0468D 1650F446 8D1650FF 6E868D16 50FF5C86 8D1650FF 61868D16 50FF6086
D89BF446 D99B227E C528C483 0014755C 9A50DE46 8D1650FC 468D1650 F8468D16
FE7086C7 0000FE6E 86C7FE74 9689FE72 868908C4 83001487 F59A0014 875F9A0D
868D160C C4830014 36719AFE 72B6FF52 FE6EB6FF FE70B6FF 50FF6286 8D160000
14875F9A F046D99B 0014875F 9AF446D9 9B50FF74 868D1650 FF72868D 1650FE76
144D029A 50CC468D 16001487 5F9A05D9 9B127EC5 0014875F 9A05D99B 167EC500
0004FE66 86C7FE68 8689FE78 868BFE6A 8689E42A FE77868A FF628689 30C48300
C602FF7E 86C60002 FF7C86C7 0001FF7A 86C7FE64 868948E0 D3FE668E 8B0001B8
FE5C9EDD 9BFE5486 DC9B0DD8 9BF046D9 9B1E7EC5 FE549EDD 9BE8D99B 01FF7F86
C4830014 88139A00 14875F9A FE668EDE 9BFE5C8E DC9B0DD8 9BF446D9 9B227EC5
9A339A36 FF2E339C 36FF2E1A 76FF1C76 FF50FF7A 868D1612 6A825689 80468908
006A006A 13740092 7E830AC4 83001488 969A5084 468D1650 520CC483 00145905
1488969A 50BA468D 168476FF 8676FF12 6A0AC483 00149250 9AD90168 046A006A
50F0468D 1650F446 8D1650FE 76868D16 50FF6686 8D1650FF 62868D16 0AC48300
9B05D99B 1E7EC520 C4830014 7E769A50 BA468D16 1E76FF20 76FF2276 FF2476FF

F44ED89B 05D99B22 7EC5FF78 868908C4 83001487 BF9A0014 875F9AF0 4ED801FE
33CA3EC5 2E097400 3D8033C2 3EC52EFF 76868908 C4830014 87BF9A00 14875F9A
FFFE64B6 FFFF72B6 FF00020D 8133CA3E C52E0974 003D8033 C63EC52E 00010D81
FE9EB6DC 9BFE8E86 DD9B0014 875F9A05 D99B1E7E C5FF74B6 FFFF78B6 FFFE68B6
9A001487 5F9AFE96 B6DC9BFE 8686DD9B 0014875F 9A05D99B 227EC500 14875F9A
FFFF78B6 FFFE64B6 FFFF5CB6 FFFF5EB6 FFFF76B6 FFFF6286 892AC483 001444F4
875F9A05 D99B227E C5001487 5F9AFC46 D99B0014 875F9A05 D99B1E7E C5FE66B6
64868B00 00FF6486 C7FF6286 892CC483 00141858 9A001487 5F9AF846 D99B0014
868D16FF 62868906 C4830014 49CE9AFF 64B6FF50 FF6A868D 165E7DFF 76863BFF
9AFF64B6 FFFF6AB6 FFFF6CB6 FFFE66B6 FFFF78B6 FFFF66B6 FFFF68B6 FF50FF62
FF0AC483 00147F90 9AFF64B6 FF50FF66 868D1650 FF62868D 1612C483 0014230B
8D160014 822A9A00 1452189A 0014795D 9A001448 E99A0014 22359A98 EBFF6486
A8468D16 04C48300 14A2CB9A FF6EB6FF FF70B6FF 04C48300 143B369A 50FF6286
04C48300 14594D9A 5096468D 160D7400 3D8333B2 3EC52E04 C4830014 594D9A50
007A001C 0014001C 01E8001C 0000CB5E 5FC99B04 C4830014 594D9A50 84468D16
0008001C 0096001C 0092001C 03C6001C 024E001C 0080001C 0068001C 007E001C

3EC52E57 560000F6 46C70000 0AC85756 001C03E8 001C03D8 001C03C8 001C01FE
107400F6 7E83FE46 895E5F00 14741C9A 50F6468D 1650FC46 8D16FF6A 35FF3C78
5689F846 8902C483 0014A702 9AFE76FF 5E5F0014 72DC9A50 F6468D16 006A5756
3EC52EFC 468B0C75 00023D05 8BF87EC5 6E750004 3D057400 023D058B F87EC5FA
C4830014 0FCC9A0C 75FF3DC5 3C803EC5 2E000005 C73C7C3E C52E09EB 05893C7C
5E5F0014 739C9A50 F6468D16 016AFC76 FF575600 000845C7 3DC53C84 3EC52E02
7EC5FF3D E9001413 A49A5E5F 001472DC 9A50F646 8D16006A 57561074 00F67E83
7E835E5F 0014739C 9A50F646 8D16016A FC76FF57 56FF30E9 03740001 3D058BF8
468D1635 FF3C783E C52E5756 5E5F0014 72DC9A50 F6468D16 006A5756 107400F6
CB5E5FC9 FEDFE95E 5F001472 DC9A50F6 468D1600 6A57565E 5F001472 7C9A50F6
0014A694 9A0A76FF 0C76FF13 740A460B 0C468B00 0005C712 7EC50000 08C85756
143D04C4 830014A6 949A0E76 FF1076FF 1D740E46 0B10468B 1B7F000F 3D04C483
46895E5F 0014731C 9A1276FF 1476FF25 6A575601 22E90006 05C7127E C50A7E00
460B0C46 8BFA5689 F8468902 C4830014 A7029A50 0103E903 74003D83 127EC5FE
8B08C483 0014A662 9AF876FF FA76FF0A 76FF0C76 FF14EB00 05C6F87E C508750A
50001005 F8468BFA 76FF0E76 FF1076FF 18EB0010 45C6F87E C509750E 460B1046

3C8836FF 2E3C8A36 FF2EFE76 FF006A57 560014A3 869A08C4 830014A6 629A01FE
006A5756 75750005 3D058B12 7EC50014 A3D89A5E 5F001473 7C9A1276 FF1476FF
003D8312 7EC5FC46 895E5F00 14745C9A 571476FF 006A3C88 36FF2E3C 8A36FF2E
3D83127E C55E5F00 1473BC9A 571476FF 3C8836FF 2E3C8A36 FF2E006A 57564F75
2E3C8A36 FF2EFE76 FF006A57 565E5F00 1472BC9A 571476FF FC76FF57 562E7500
000AF846 C700003A C85756CB 5E5FC95E 5F001473 7C9A1276 FF1476FF 3C8836FF
3C9236FF 2E3C9436 FF2E3C96 36FF2E00 0005C712 7EC50000 F446C700 00F246C7
3C9E36FF 2E2075C2 0B025589 05893C8C 3EC52E08 C4830014 8A609A3C 9036FF2E
F876FF57 5608C483 00145B1C 9A500024 053C9806 8B2E3C9A 36FF2E3C 9C36FF2E
56028BE9 0374003D 83127EC5 05893C78 3EC52E5E 5F001472 9C9A1276 FF1476FF
2AF7468A 026EE903 74003D83 127EC5F7 46885E5F 001473DC 9A571476 FF006A57
E42AF746 8A5756F7 468800C1 B803EBFF FD05E42A F7468A0A 7600C13D FFFD05E4
2E5E5F00 1472FC9A 1276FF14 76FF016A 080068F2 76FFF476 FF006A33 CE680E50
5E5F0014 731C9A57 1476FF0C 6A575602 19E90374 003D8312 7EC50589 3CA03EC5
55890589 3C843EC5 2E02C483 0014A702 9A5001FC E9037400 3D83127E C5FC4689
55890589 10568B0E 468B3DC5 3C843EC5 2E065589 0445890C 568B0A46 8B3DC502

FF006A57 5600000A 45C73DC5 3C843EC5 2E000108 45C73DC5 3C843EC5 2E0201FE
74003D83 127EC55E 5F001473 7C9A1276 FF1476FF 3CA436FF 2E3CA636 FF2EFC76
6BE90374 003D8312 7EC5FA46 895E5F00 1473FC9A 571476FF 016A5756 0188E903
7EC5FE46 895E5F00 14745C9A 571476FF 006A3CA8 36FF2E3C AA36FF2E 50575601
783EC52E 02558905 893C803E C52E02C4 830014A7 029A5001 43E90374 003D8312
0014735C 9A1276FF 1476FF00 6A016A00 6A575608 45893DC5 3C803EC5 2E058B3C
00149024 9A016A50 C6468D16 00F8E903 74003D83 127EC505 893CAC3E C52E5E5F
003D833C B03EC52E 000005C7 3CB43EC5 2E05893C B03EC52E E42AE846 8A06C483
36FF2E3C C236FF2E 57560255 8905893C B83EC52E 3CBE168B 2E3CBC06 8B2E2B74
6A575600 8FE90374 000C7D83 3DC53C80 3EC52E5E 5F003C00 029A196A 206A3CC0
830014A7 029A5073 75003D83 127EC5EC 46895E5F 0014731C 9A1276FF 1476FF02
3CAC3EC5 2EEC76FF 35FF3C78 3EC52E57 56000205 C7EE7EC5 F05689EE 468902C4
35FF3CAC 3EC52E57 56357500 3D83127E C55E5F00 14743C9A 1276FF14 76FF35FF
76FF5756 1075003D 83127EC5 EA46895E 5F001474 7C9A1276 FF1476FF FF6A016A
3EC52E00 0005C70E 7EC50000 02C85756 CB5E5FC9 5E5F0014 72BC9A57 1476FFEC
006A006A 5974000A 7D833DC5 3C843EC5 2E025589 05890C56 8B0A468B 3DC53C84

803EC52E 10C48300 14643F9A 3CC436FF 2E3CC636 FF2E006A 006A006A 006A01FE
0C68006A 006A006A 006A0BEB 111F6800 6A006A00 6A006A0D 74000C7D 833DC53C
7D833DC5 3C843EC5 2E0122E9 02C48300 14A71E9A 1717680A C4830014 92509A15
DA269B05 DB9B3DC5 35C43C84 3EC52EFE 4689058B 3CB43EC5 2E0112E9 03740008
7E00143D 05893CB4 3EC52E08 C4830014 87BF9A00 14875F9A 3CC80EDC 2E9B0474
00143D05 8B3CB43E C52E5F74 003D833C B03EC52E 00CDE903 7FFE463B 00D5E903
C2168B2E 3CC0068B 2E50FE46 2B058B3C B43EC52E 0E76FF10 76FF0013 05C70475
FF3DC53C B83EC52E 0B6A056A 35FF3CD0 3EC52E35 FF3CD43E C52E5052 FE46033C
C036FF2E 3CC236FF 2E575664 EB16C483 0014A04A 9A35FF3D C53CB83E C52E0275
05C63C03 263CC03E C52E3CB4 36C42E5E 5F003C00 029A35FF 3CB43EC5 2E206A3C
9A35FF02 75FF3C8C 3EC52E3C D836FF2E 3CDA36FF 2E3CC036 FF2E3CC2 36FF2E00
5756CB5E 5FC99B04 C4830014 8CC39A35 FF0275FF 3C8C3EC5 2E0CC483 00145B1C
0374003D 830A7EC5 FA46895E 5F001473 1C9A0A76 FF0C76FF 026A5756 00000AC8
3DC53C80 3EC52E00 0105C7FC 7EC5FE56 89FC4689 02C48300 14A7029A 500119E9
747C9A0A 76FF0C76 FF006A01 6A35FF3C AC3EC52E 57560014 A3869A00 000845C7
FF0C76FF 35FF3CAC 3EC52EFA 76FF35FF 3C783EC5 2E575600 14A3D89A 5E5F0014

7C9A0A76 FF0C76FF FF6A016A 35FF3CAC 3EC52E57 565E5F00 14743C9A 0A7601FE
1472BC9A 570C76FF FA76FF57 56008BE9 0374003D 830A7EC5 F646895E 5F001474
36FF2E00 6A57565E 5F001473 3C9A0A76 FF0C76FF 35FF3CAC 3EC52E57 565E5F00
75003D83 0A7EC5F8 46895E5F 0014745C 9A0A76FF 0C76FF00 6A3CA436 FF2E3CA6
FFF876FF 57565E5F 001473BC 9A570C76 FF3CA436 FF2E3CA6 36FF2E00 6A57563D
5FC904C4 8300148D 2A9A35FF 0275FF3C 8C3EC52E 5E5F0014 72BC9A0A 76FF0C76
0E2F001C 0E28001C 0ECC001C 0E68001C 0EC0001C 0EBC001C 0EC6001C 0EC4CB5E
0ECA001C 0EC8001C 0E8E001C 0E80001C 0E72001C 0E8C001C 0E31001C 0BBE001C
072C001C 07264034 00000000 0000001C 0E4E001C 0E94001C 0728001C 0E90001C
016AEC8B 555756CB 5E5FC902 C4830FA0 68DF9A00 6AEC8B55 5756001C 0E55001C
56CB5E5F C902C483 0FA068DF 9A026AEC 8B555756 CB5E5FC9 02C4830F A068DF9A
C4830FA0 68DF9A04 6AEC8B55 5756CB5E 5FC902C4 830FA068 DF9A036A EC8B5557
9A066AEC 8B555756 CB5E5FC9 02C4830F A068DF9A 056AEC8B 555756CB 5E5FC902
5756CB5E 5FC902C4 830FA068 DF9A076A EC8B5557 56CB5E5F C902C483 0FA068DF
02C4830F A068DF9A 096AEC8B 555756CB 5E5FC902 C4830FA0 68DF9A08 6AEC8B55
DF9A0B6A EC8B5557 56CB5E5F C902C483 0FA068DF 9A0A6AEC 8B555756 CB5E5FC9

```
56CB5E5F C902C483 0FA068DF 9A0C6AEC 8B555756 CB5E5FC9 02C4830F A06801FE
C4830FA0 68DF9A0E 6AEC8B55 5756CB5E 5FC902C4 830FA068 DF9A0D6A EC8B5557
9A106AEC 8B555756 CB5E5FC9 02C4830F A068DF9A 0F6AEC8B 555756CB 5E5FC902
5756CB5E 5FC902C4 830FA068 DF9A116A EC8B5557 56CB5E5F C902C483 0FA068DF
02C4830F A068DF9A 136AEC8B 555756CB 5E5FC902 C4830FA0 68DF9A12 6AEC8B55
DF9A156A EC8B5557 56CB5E5F C902C483 0FA068DF 9A146AEC 8B555756 CB5E5FC9
555756CB 5E5FC902 C4830FA0 68DF9A16 6AEC8B55 5756CB5E 5FC902C4 830FA068
C902C483 0FA068DF 9A186AEC 8B555756 CB5E5FC9 02C4830F A068DF9A 176AEC8B
68DF9A1A 6AEC8B55 5756CB5E 5FC902C4 830FA068 DF9A196A EC8B5557 56CB5E5F
8B555756 CB5E5FC9 02C4830F A068DF9A 1B6AEC8B 555756CB 5E5FC902 C4830FA0
5FC902C4 830FA068 DF9A1D6A EC8B5557 56CB5E5F C902C483 0FA068DF 9A1C6AEC
A068DF9A 1F6AEC8B 555756CB 5E5FC902 C4830FA0 68DF9A1E 6AEC8B55 5756CB5E
EC8B5557 56CB5E5F C902C483 0FA068DF 9A206AEC 8B555756 CB5E5FC9 02C4830F
5E5FC902 C4830FA0 68DF9A22 6AEC8B55 5756CB5E 5FC902C4 830FA068 DF9A216A
0FA068DF 9A246AEC 8B555756 CB5E5FC9 02C4830F A068DF9A 236AEC8B 555756CB
6AEC8B55 5756CB5E 5FC902C4 830FA068 DF9A256A EC8B5557 56CB5E5F C902C483

5FC902C4 830FA068 DF9A276A EC8B5557 56CB5E5F C902C483 0FA068DF 9A2601FE
A068DF9A 296AEC8B 555756CB 5E5FC902 C4830FA0 68DF9A28 6AEC8B55 5756CB5E
EC8B5557 56CB5E5F C902C483 0FA068DF 9A2A6AEC 8B555756 CB5E5FC9 02C4830F
5E5FC902 C4830FA0 68DF9A2C 6AEC8B55 5756CB5E 5FC902C4 830FA068 DF9A2B6A
0FA068DF 9A2E6AEC 8B555756 CB5E5FC9 02C4830F A068DF9A 2D6AEC8B 555756CB
6AEC8B55 5756CB5E 5FC902C4 830FA068 DF9A2F6A EC8B5557 56CB5E5F C902C483
CB5E5FC9 02C4830F A068DF9A 316AEC8B 555756CB 5E5FC902 C4830FA0 68DF9A30
830FA068 DF9A336A EC8B5557 56CB5E5F C902C483 0FA068DF 9A326AEC 8B555756
356AEC8B 555756CB 5E5FC902 C4830FA0 68DF9A34 6AEC8B55 5756CB5E 5FC902C4
56CB5E5F C902C483 0FA068DF 9A366AEC 8B555756 CB5E5FC9 02C4830F A068DF9A
C4830FA0 68DF9A38 6AEC8B55 5756CB5E 5FC902C4 830FA068 DF9A376A EC8B5557
9A3A6AEC 8B555756 CB5E5FC9 02C4830F A068DF9A 396AEC8B 555756CB 5E5FC902
5756CB5E 5FC902C4 830FA068 DF9A3B6A EC8B5557 56CB5E5F C902C483 0FA068DF
02C4830F A068DF9A 3D6AEC8B 555756CB 5E5FC902 C4830FA0 68DF9A3C 6AEC8B55
DF9A3F6A EC8B5557 56CB5E5F C902C483 0FA068DF 9A3E6AEC 8B555756 CB5E5FC9
555756CB 5E5FC902 C4830FA0 68DF9A40 6AEC8B55 5756CB5E 5FC902C4 830FA068

C4830FA0 68DF9A42 6AEC8B55 5756CB5E 5FC902C4 830FA068 DF9A416A EC8B01FE
9A446AEC 8B555756 CB5E5FC9 02C4830F A068DF9A 436AEC8B 555756CB 5E5FC902
5756CB5E 5FC902C4 830FA068 DF9A456A EC8B5557 56CB5E5F C902C483 0FA068DF
02C4830F A068DF9A 476AEC8B 555756CB 5E5FC902 C4830FA0 68DF9A46 6AEC8B55
DF9A496A EC8B5557 56CB5E5F C902C483 0FA068DF 9A486AEC 8B555756 CB5E5FC9
555756CB 5E5FC902 C4830FA0 68DF9A4A 6AEC8B55 5756CB5E 5FC902C4 830FA068
C902C483 0FA068DF 9A4C6AEC 8B555756 CB5E5FC9 02C4830F A068DF9A 4B6AEC8B
68DF9A4E 6AEC8B55 5756CB5E 5FC902C4 830FA068 DF9A4D6A EC8B5557 56CB5E5F
8B555756 CB5E5FC9 02C4830F A068DF9A 4F6AEC8B 555756CB 5E5FC902 C4830FA0
5FC902C4 830FA068 DF9A516A EC8B5557 56CB5E5F C902C483 0FA068DF 9A506AEC
A068DF9A 536AEC8B 555756CB 5E5FC902 C4830FA0 68DF9A52 6AEC8B55 5756CB5E
EC8B5557 56CB5E5F C902C483 0FA068DF 9A546AEC 8B555756 CB5E5FC9 02C4830F
5E5FC902 C4830FA0 68DF9A56 6AEC8B55 5756CB5E 5FC902C4 830FA068 DF9A556A
0FA068DF 9A586AEC 8B555756 CB5E5FC9 02C4830F A068DF9A 576AEC8B 555756CB
6AEC8B55 5756CB5E 5FC902C4 830FA068 DF9A596A EC8B5557 56CB5E5F C902C483
CB5E5FC9 02C4830F A068DF9A 5B6AEC8B 555756CB 5E5FC902 C4830FA0 68DF9A5A

A068DF9A 5D6AEC8B 555756CB 5E5FC902 C4830FA0 68DF9A5C 6AEC8B55 575601FE
EC8B5557 56CB5E5F C902C483 0FA068DF 9A5E6AEC 8B555756 CB5E5FC9 02C4830F
5E5FC902 C4830FA0 68DF9A60 6AEC8B55 5756CB5E 5FC902C4 830FA068 DF9A5F6A
0FA068DF 9A626AEC 8B555756 CB5E5FC9 02C4830F A068DF9A 616AEC8B 555756CB
6AEC8B55 5756CB5E 5FC902C4 830FA068 DF9A636A EC8B5557 56CB5E5F C902C483
CB5E5FC9 02C4830F A068DF9A 656AEC8B 555756CB 5E5FC902 C4830FA0 68DF9A64
830FA068 DF9A676A EC8B5557 56CB5E5F C902C483 0FA068DF 9A666AEC 8B555756
696AEC8B 555756CB 5E5FC902 C4830FA0 68DF9A68 6AEC8B55 5756CB5E 5FC902C4
56CB5E5F C902C483 0FA068DF 9A6A6AEC 8B555756 CB5E5FC9 02C4830F A068DF9A
C4830FA0 68DF9A6C 6AEC8B55 5756CB5E 5FC902C4 830FA068 DF9A6B6A EC8B5557
863EC52E 2C468B05 894C823E C52EFFFF 0532468B 00001EC8 575600CB 5E5FC902
2E4C8636 C42E0501 00012505 894C8E3E C52E4005 894C8A3E C52E2A46 8B05894C
30468B05 894C963E C52E2E46 8B05894C 923EC52E 04032600 0125058B 4C863EC5
7E830000 EA46C700 0005C74C A23EC52E 000005C7 4C9E3EC5 2E05894C 9A3EC52E
9A3EC52E 05FF4C9E 3EC52E07 740523E0 D3EA4E8B 0001B84C 963EC52E 357D04EA
058B4CA2 3EC52EC5 EBEA46FF 05FF4CA2 3EC52E07 740523E0 D3EA4E8B 0001B84C
```

E866F705 8B4C8E3E C52E0777 043B2605 8B4C923E C52E4C8E 36C42EE8 468901FE
2EC88B02 E0C1058B 4C923EC5 2E025589 05894CA6 3EC52E02 C4830014 A23E9A50
C52E02C4 830014A2 3E9A50FE 4689C103 E0D124F7 26058B4C 8E3EC52E 4CA236C4
4CAA3EC5 2E05894C B23EC52E 05894CAE 3EC52ED2 2BFFFF25 02558905 894CAA3E
C52E4C8E 36C42EE8 4689058B 4CB23EC5 2E025589 05894CB6 3EC52E02 558B058B
89E64689 02558B05 8B4CAA3E C52E0589 4CBA3EC5 2EE84603 24F72605 8B4CA23E
C52E0255 8905894C BE3EC52E E6460304 2B26058B 4CBA3EC5 2E4CAE36 C42EE856
894CC23E C52EE846 0324F726 058B4CA2 3EC52E4C 8E36C42E E8468905 8B4CBA3E
042B2605 8B4CC23E C52E4CAE 36C42EE8 5689E646 8902558B 058B4CAA 3EC52E05
CA3EC52E 04032605 8B4C923E C52E4CC2 36C42E02 55890589 4CC63EC5 2EE64603
26058B4C CA3EC52E 4CAE36C4 2EE85689 E6468902 558B058B 4CAA3EC5 2E05894C
C52E0403 26058B4C 923EC52E 4CCA36C4 2E025589 05894CCE 3EC52EE6 4603042B
8B4CD23E C52E4CAE 36C42EE8 5689E646 8902558B 058B4CAA 3EC52E05 894CD23E
04032605 8B4C923E C52E4CD2 36C42E02 55890589 4CD63EC5 2EE64603 042B2605
DA3EC52E 4CAE36C4 2EE85689 E6468902 558B058B 4CAA3EC5 2E05894C DA3EC52E
6A35FF02 75FF4CAA 3EC52E57 56025589 05894CDE 3EC52EE6 4603042B 26058B4C

DC2E9BFA 46D99BFA 5ED99B22 76DC9B1A 46DD9B5E 5F003C00 029AFE76 FF0001FE
83001487 BF9A0014 875F9AFA 46D99BF2 5ED99BEE D99B4C76 0014875A 9A4CE21E
9B0A7600 14875A9A E25EDC9B EE66DE9B FA46D99B E25EDD9B EED99BEE 468908C4
14876D9A 50EE4689 C02B16EB E0D99BEE 66DE9BFA 46D99B23 EBEE66DE 9BFA46D9
73053BF0 468B4C92 3EC52E00 00F046C7 F65ED99B FA46D99B F25ED99B 02C48300
36C42E08 C4830014 87BF9A00 14875F9A 4CEA0EDC 2E9BF246 D99B0000 EC46C77B
2E9BF246 D99BF25E D99BF246 D89BF646 D99B0588 025C8E26 3C0326F0 7E8B4CC6
01EE468B F25ED99B F26ED89B 4CE206DD 2E9BEC46 FF117200 14875A9A 4CE21EDC
0A46DD9B FF79E9F0 46FF0588 EC468B02 5C8E263C 0326F07E 8B4CCE36 C42EEC46
56CB5E5F C99B1DD9 9B4CF63E C52EE0D9 9B05D99B 1DD99B4C F23EC52E 1276DC9B
35FF0275 FF4CA63E C52E04C4 830014A2 CB9A35FF 0275FF4C AA3EC52E EC8B5557
9E3EC52E 0000FE46 C70000FC 46C70000 06C85756 CB5E5FC9 04C48300 14A2CB9A
EBFE46FF 05750523 E0D3FE4E 8B0001B8 4C963EC5 2E0095E9 037C053B FE468B4C
0125058B 4C8A3EC5 2E4C8A36 C42EEA74 0523E0D3 FE4E8B00 01B84C9A 3EC52EDB
0C568B0A 4603FA46 8B505210 568B0E46 03FC468B 5756FA46 89FE66F7 04032600
058A105E 8E0E7E03 FFC783FC 7E033D8B 4C8A3EC5 2E5E5F00 2C00029A 35FF5052

E9FC4601 058B4C8E 3EC52E05 88105E8E 0E7E03FC 7E033D8B 4C8A3EC5 2E9801FE
D89B4CF6 3EC52E05 D99B4CF2 3EC52E00 00F246C7 000018C8 5756CB5E 5FC9FF7C
C4830014 87DA9A00 14875F9A 08C48300 14A6BC9A 0014875F 9A05D99B 1DD99B05
9B4CF63E C52EE85E DD9B02C4 83001487 759A35FF F0468940 05894CFA 3EC52E08
BF9A0014 875F9A08 C4830014 A6BC9A00 14875F9A 4CEA0EDC 2E9BE866 DC9B05D9
3EC52E01 20E90375 043B2605 8B4CFA3E C52E4CFE 36C42EF8 468908C4 83001487
2E0E7204 3B26058B 4CFA3EC5 2E4C8236 C42EF046 89058B24 72053BF0 468B4C82
2E587504 3B264005 8B4CFE3E C52E4CFA 36C42E05 894CFA3E C52E058B 4C823EC5
05894CB6 3EC52E02 558B058B 4CBE3EC5 2EEE5689 EC468902 558B058B 4CB63EC5
3EC52EEA 4689058B 4CB23EC5 2E025589 05894CBE 3EC52EEE 568BEC46 8B025589
F4468D16 50F2468D 163EEB05 894CBA3E C52EEA46 8B05894C B23EC52E 058B4CBA
3EC52E01 54E90374 00F27E83 0CC48300 14527D9A 5052D22B 058B4CFA 3EC52E50
8B50F446 8D1650F2 468D1608 C4830014 49169AF4 76FFF676 FF35FF02 75FF4CB6
FF0275FF 4CBE3EC5 2E011AE9 037400F2 7E830CC4 83001452 7D9A5052 D22BF046
3EC52E05 894CFE3E C52E058B 4CFA3EC5 2E08C483 00144916 9AF476FF F676FF35
4CA23EC5 2E0000FE 46C706C4 83001428 DA9A35FF 0275FF4C DE3EC52E 35FF4C86

25F7FE46 8B4C923E C52EFC46 8925F74C 8E3EC52E 00B5E903 7C053BFE 468B01FE
2E05894C B23EC52E FC460304 2B260255 8B058B4C B63EC52E 4CAA36C4 2EFA4689
F876FF35 FF4CDA3E C52E0589 4CBA3EC5 2EFC4603 042B2602 558B058B 4CBE3EC5
BA3EC52E 35FF4CC2 3EC52E35 FF4CCA3E C52E35FF 4CD23EC5 2E35FF4C 863EC52E
558B0503 FA468B4C A63EC52E 575610C4 8300149A CC9A35FF 4CB23EC5 2E35FF4C
3CE9FE46 FF5E5F00 2C00029A 35FF4C86 3EC52E35 FF0275FF 4CD63EC5 2E505202
001C108C 00CB5E5F C99BF246 8B025589 05890C7E C502558B 058B4CA6 3EC52EFF
001C10BE 001C10BC 001C10C2 001C10C0 001C10BA 001C10B8 001C10B4 001C10B6
001C10AA 001C1092 001C10A8 001C108E 001C10A6 001C10B0 001C10C8 001C10C4
00000000 001C10A2 001C10B2 001C1096 001C10AE 001C109E 001C10AC 001C109A
38C85756 001C1080 001C108A 001C1082 001C1086 40300000 00000000 3FF00000
00E546C6 00EF46C6 00F146C6 0001F246 C70001F4 46C700F7 46C601F9 46C60008
FA7E830C C4830014 82A19A0A 76FF0C76 FF3676FF 3876FF50 FA468D16 00E346C6
8D160255 89058954 363EC52E 02C48300 14A23E9A 20006804 C4E9FA46 8B067400
E2868D16 5756C975 00FA7E83 0CC48300 1482ED9A 0A76FF0C 76FF35FF 5250FA46
02558B05 8B54363E C52E5E5F 002C0002 9A080068 35FF0275 FF54363E C52E50F7

830000F7 DE86C700 00F7D886 C7000005 C7543A3E C52EF7DC 9689F7DA 868901FE
F7DEB68B C88BE0D1 F7D6868B 53740100 F7D6BE81 0000F7D6 86C7677D 04F7DEBE
F7D6863B F7E08689 06F8C100 20053FFF 25F7E285 8BF903FE 031F16FD 8B09E6C1
88F7E086 8BF7DC9E 8EF7DABE 03F7D886 FFF7D8BE 8B000105 C7543A3E C52E0974
1E46DD9B 3676C4F7 C89EDD9B 2845DD9B 367EC592 EBF7DE86 FFA5EBF7 D686FF05
1487DA9A 0014875F 9A08C483 0014A5DC 9A001487 5F9AF7C8 B6DC9B18 4CDC269B
C89EDD9B 2874DC26 9B184DDC 9B0E46DD 9B367EC5 3676C405 892E7EC5 08C48300
14875F9A 08C48300 14A5DC9A 0014875F 9AE0D99B F7C8A6DC 9B544206 DD2E9BF7
CE868905 89544A3E C52E0C45 8B367EC5 0589543E 3EC52E08 C4830014 87DA9A00
2E7EC5F7 CC868905 8B544A3E C52EF7CE 862B042B 26058B2E 7EC5543E 36C42EF7
C42E0589 54523EC5 2E058B54 3E3EC52E 0589544E 3EC52EF7 CC862B04 2B26058B
3EC52E00 0005C754 5A3EC52E 05895456 3EC52E04 0326058B 544A3EC5 2E545236
45DD9B36 7EC50001 05C7545A 3EC52E09 74003D83 544E3EC5 2E0A7500 3D83543E
14A5DC9A 0014875F 9AF7C8B6 DC9B104C DC269B26 46DD9B36 76C4F7C8 9EDD9B20
1646DD9B 367EC536 76C40589 327EC508 C4830014 87DA9A00 14875F9A 08C48300
14875F9A E0D99BF7 C8A6DC9B 544206DD 2E9BF7C8 9EDD9B20 74DC269B 104DDC9B

C5058954 5E3EC52E 08C48300 1487DA9A 0014875F 9A08C483 0014A5DC 9A0001FE
CE862B04 2B26058B 2E7EC554 5E36C42E F7CE8689 05895462 3EC52E08 458B367E
2E058954 663EC52E F7CC862B 042B2605 8B2E7EC5 F7CC8689 058B5462 3EC52EF7
6E3EC52E 04032605 8B54623E C52E546A 36C42E05 89546A3E C52E058B 545E3EC5
C09A3475 FF3675FF 026A006A F7CE9689 F7CC8689 36558B34 458B367E C5058954
04032600 0125058B 2E7EC52E 76C4F7D4 8689F7CE 9613F7CC 860308C4 83001488
76F7DE86 3BE42A01 458A367E C5000005 C754723E C52E0000 F7DE86C7 F7D28689
8B54723E C52ED9EB F7DE86FF 06750002 7D830674 C00BE0D3 F7DE8E8B 0001B85F
54723EC5 2E058924 F726F7D4 868B5472 36C42E54 781E8E2E 54763E03 2EE7D13D
B4EB05FF 54723EC5 2E058924 F726F7D2 868B547C 1E8E2E54 7A3E032E E7D13D8B
89058954 7E3EC52E 02C48300 14A23E9A 50F7D086 8925F7F7 D2868B54 723EC52E
02C48300 14A23E9A F7D0B6FF 5E5F003C 00029AF7 D0B6FF00 FF685052 57560255
8B367EC5 5E5F003C 00029AF7 D0B6FF00 FF685052 57560255 89058954 823EC52E
E6468900 DA830001 2DEC5613 EA46030E 558B0C45 8BEC5689 EA46893A 558B3845
2AEF468A EA76FFEC 76FFE676 FF525486 36FF2E54 8836FF2E 50FA468D 16E85689
FF0C76FF 50E42AF9 468A50E4 2AF7468A F476FF50 F2468D16 50E42AF1 468A50E4

2E0000FE 46C70000 FC46C7FB 94E90374 00FA7E83 22C48300 1483D19A 0A7601FE
8BD88BD2 2B058B50 E42AE546 8A50E42A E3468A50 FA468D16 000005C7 548A3EC5
35FF0275 FF54863E C52E5052 D113C303 FE5613FC 46033A55 8B38458B 367EC5CA
C52E0000 02C85756 CB5E5FC9 9BC02BFB 38E90374 00FA7E83 10C48300 1483F79A
830014A2 CB9A35FF 0275FF54 7E3EC52E 04C48300 14A2CB9A 35FF0275 FF54363E
75FF5486 3EC52E50 FE468D16 04C48300 14A2CB9A 35FF0275 FF54823E C52E04C4
C85756CB 5E5FC9FE 468B0000 FE46C705 7500FE7E 8308C483 00148430 9A35FF02
2E15770A 463B1A77 07720C56 3BD22B05 8B546A3E C52E0000 05C7127E C500001A
6A3EC52E 0169E954 7E3EC52E 08770A46 3B0D7707 720C563B D22B058B 546E3EC5
C52E548E 36C42EF4 5689F246 89D11BC3 2B0C568B 0A468BCA 8BD88BD2 2B058B54
058B5492 3EC52E4D 77F2463B 527F077C F4563B02 54132604 03269905 8B54923E
549A36FF 2E549C36 FF2E50EE 468D1612 76FF1476 FF025511 0501548E 3EC52E99
1D9A35FF 0275FF54 863EC52E 549636FF 2E549836 FF2E5492 36FF2E54 9436FF2E
02558B05 8B549A3E C52EE856 89E64689 02558B05 8B54963E C52E18C4 83001484
8EEA7E03 E7D1F88B 02541B26 042B26F4 568BF246 8B548E36 C42EEC56 89EA4689
C70093E9 0375003D 83545A3E C52E0255 8905890E 7EC5E856 8BE64603 058BEC5E

2E54763E 032EE7D1 FE7E8B0E 76C4707D 053BFE46 8B54723E C52E0000 FE4601FE
EA468902 558B058B 54823EC5 2EFC5689 FA468902 548B2604 0326058B 54781E8E
89EA4603 04032605 8B547C1E 8E2E547A 3E032EE7 D1FE7E8B 543E36C4 2EEC5689
FE46FF5E 5F002C00 029A35FF 544A3EC5 2EFA76FF FC76FF50 525756F8 5689F646
001C0FBE 001C0FC0 CB5E5FC9 02558905 890E7EC5 02558B05 8B54823E C52E84EB
001C0F68 001C0F66 001C0F64 001C0F62 001C0F60 3FE00000 00000000 001C0F5E
001C0F9E 001C0F7E 001C0F7C 001C0F72 001C0F70 001C0F6E 001C0F6C 001C0F6A
001C0FC8 001C0FC4 001C0F54 001C0F50 001C0F5A 001C0F56 001C0F78 001C0F74
CB5E5FC9 04C48300 1479EE9A 575AC236 FF2E0000 05C75AC0 3EC52EEC 8B555756
147A279A 0A76FF0C 76FF575A C236FF2E 066A0000 05C75AC0 3EC52EEC 8B555756
8B555756 CB5E5FC9 0AC48300 1488969A 5AC436FF 2E5AC636 FF2E5052 08C48300
08C48300 147A019A 0A76FF0C 76FF575A C236FF2E 066A0000 05C75AC0 3EC52EEC
3EC52EEC 8B555756 CB5E5FC9 0AC48300 1488969A 5AC836FF 2E5ACA36 FF2E5052
FF2E5052 08C48300 147A149A 0A76FF0C 76FF575A C236FF2E 066A0000 05C75AC0
05C75AC0 3EC52EEC 8B555756 CB5E5FC9 0AC48300 1488969A 5ACC36FF 2E5ACE36
2EEC8B55 5756CB5E 5FC908C4 8300147A AC9A0A76 FF0C76FF 575AC236 FF2E0000

8B555756 CB5E5FC9 04C48300 147B319A 575AC236 FF2E0000 05C75AC0 3EC501FE
FF0C76FF 0E76FF10 76FF1276 FF1476FF 575AC236 FF2E0000 05C75AC0 3EC52EEC
C236FF2E 000005C7 5AC03EC5 2EEC8B55 5756CB5E 5FC910C4 8300147A E59A0A76
CB5E5FC9 10C48300 147AF89A 0A76FF0C 76FF0E76 FF1076FF 1276FF14 76FF575A
FF0C76FF 0E76FF10 76FF575A C236FF2E 686A0000 05C75AC0 3EC52EEC 8B555756
5FC90AC4 83001488 969A5AD0 36FF2E5A D236FF2E 50520CC4 8300147B 0B9A0A76
147BA39A 0A76FF0C 76FF575A C236FF2E 000005C7 5AC03EC5 2EEC8B55 5756CB5E
FF0E76FF 575AC236 FF2E0000 05C75AC0 3EC52EEC 8B555756 CB5E5FC9 08C48300
6A000005 C75AC03E C52EEC8B 555756CB 5E5FC90A C4830014 7C029A0A 76FF0C76
50520EC4 8300147A D29A0A76 FF0C76FF 0E76FF10 76FF1276 FF575AC2 36FF2E08
5AC03EC5 2EEC8B55 5756CB5E 5FC90AC4 83001488 969A5AD4 36FF2E5A D636FF2E
00147ABF 9A0A76FF 0C76FF0E 76FF1076 FF1276FF 575AC236 FF2E066A 000005C7
EC8B5557 56CB5E5F C90AC483 00148896 9A5AD836 FF2E5ADA 36FF2E50 520EC483
EC8B5557 56CB5E5F C904C483 00147B1E 9A575AC2 36FF2E00 0005C75A C03EC52E
5E5FC908 C4830014 7B449A0A 76FF0C76 FF575AC2 36FF2E00 0005C75A C03EC52E
76FF0E76 FF1076FF 1276FF57 5AC236FF 2E000005 C75AC03E C52EEC8B 555756CB

000005C7 5AC03EC5 2EEC8B55 5756CB5E 5FC90EC4 8300147B 579A0A76 FF0C01FE
5756CB5E 5FC90CC4 8300147B 6A9A0A76 FF0C76FF 0E76FF10 76FF575A C236FF2E
7D9A0A76 FF0C76FF 0E76FF10 76FF575A C236FF2E 000005C7 5AC03EC5 2EEC8B55
76FF575A C236FF2E 000005C7 5AC03EC5 2EEC8B55 5756CB5E 5FC90CC4 8300147B
0005C75A C03EC52E EC8B5557 56CB5E5F C90AC483 00147B90 9A0A76FF 0C76FF0E
00147A3A 9A0A76FF 0C76FF0E 76FF1076 FF1276FF 1476FF57 5AC236FF 2E126A00
EC8B5557 56CB5E5F C90AC483 00148896 9A5ADC36 FF2E5ADE 36FF2E50 5210C483
0C76FF0E 76FF1076 FF1276FF 1476FF57 5AC236FF 2E126A00 0005C75A C03EC52E
C90AC483 00148896 9A5AE036 FF2E5AE2 36FF2E50 5210C483 00147A4D 9A0A76FF
FF1276FF 1476FF57 5AC236FF 2E126A00 0005C75A C03EC52E EC8B5557 56CB5E5F
9A5AE436 FF2E5AE6 36FF2E50 5210C483 00147A60 9A0A76FF 0C76FF0E 76FF1076
5AC236FF 2E126A00 0005C75A C03EC52E EC8B5557 56CB5E5F C90AC483 00148896
36FF2E50 5210C483 00147A73 9A0A76FF 0C76FF0E 76FF1076 FF1276FF 1476FF57
0005C75A C03EC52E EC8B5557 56CB5E5F C90AC483 00148896 9A5AE836 FF2E5AEA
C52EEC8B 555756CB 5E5FC908 C4830014 7A869A0A 76FF0C76 FF575AC2 36FF2E00
147A999A 0A76FF0C 76FF0E76 FF1076FF 1276FF57 5AC236FF 2E000005 C75AC03E

575AC236 FF2E126A 000005C7 5AC03EC5 2EEC8B55 5756CB5E 5FC90EC4 830001FE
FF2E5AEE 36FF2E50 520EC483 00147BC9 9A0A76FF 0C76FF0E 76FF1076 FF1276FF
2E126A00 0005C75A C03EC52E EC8B5557 56CB5E5F C90AC483 00148896 9A5AEC36
FF2E5052 0EC48300 147BDC9A 0A76FF0C 76FF0E76 FF1076FF 1276FF57 5AC236FF
05C75AC0 3EC52EEC 8B555756 CB5E5FC9 0AC48300 1488969A 5AF036FF 2E5AF236
2EEC8B55 5756CB5E 5FC908C4 8300147B EF9A0A76 FF0C76FF 575AC236 FF2E0000
CB5E5FC9 08C48300 147CF99A 575AC236 FF2E0A76 FF0C76FF 000005C7 [illegible]C03EC5
C52EEC8B 555756CB 5E5FC905 8B5AF43E C52E0000 05C75AC0 3EC52EEC 8B555756
147D0C9A 0A76FF0C 76FF0E76 FF1076FF 1276FF57 5AC236FF 2E000005 C75AC03E
001C0DAE 001C0D46 001C0D40 001C0D3A 001C0D34 001C0D2A CB5E5FC9 0EC48300
001C0D32 001C0E16 001C0E04 001C0DF2 001C0DE0 001C0DCE 001C0DBC 001C0DB6
08C48300 145B7C9A 50001205 60AA068B 2E60AC36 FF2E500A 468D16EC 8B555756
CB5E5FC9 08C48300 145B7C9A 0A76FF0C 76FF500E 468D16EC 8B555756 CB5E5FC9
F846890C 568B0A46 8BF65689 F446890C 568B0A46 8B0009EE 46C70000 12C85756
0005C6F4 7EC508C4 8300145B 7C9A50EE 468D1650 0E468D16 7D00F046 C7FA5689
46890255 8B058BF8 7EC5FA56 89F84689 10568B0E 468B0000 64C85756 CB5E5FC9

E90375F6 0B187400 253DF08B E42A058A E046FFE0 7EC504F8 4683E256 89E001FE
EA46C7FF FFE846C7 0020EC46 C7D7EB06 C4830014 96649A56 0A76FF0C 76FF03D8
058AE046 FFE07E8B 0001EE46 C713752D FE83F08B E42A058A E046FFE0 7EC5FFFF
8BE42A05 8AE046FF E07EC500 30EC46C7 117530FE 830000EE 46C705EB F08BE42A
E84689D8 F70001EE 46C70A7D C00BE846 89058B02 F84683F8 7EC52875 2AFE83F0
E8466B1E 7F39FE83 237C30FE 830000E8 46C72DEB F08BE42A 058AE046 FFE07EC5
58752EFE 83D8EBF0 8BE42A05 8AE046FF E07EC5E8 46890030 2DC703C6 8BF88B0A
E07EC5EA 4689058B 02F84683 F87EC51A 752AFE83 F08BE42A 058AE046 FFE07EC5
F88B0AEA 466B1E7F 39FE8323 7C30FE83 0000EA46 C72DEBF0 8BE42A05 8AE046FF
E07EC527 756CFE83 D8EBF08B E42A058A E046FFE0 7EC5EA46 8900302D C703C68B
25C68B07 7578FE83 057475FE 830A746F FE830F74 64FE83F0 8BE42A05 8AE046FF
B95D26BB C68B0001 E446C7FE 5689FC46 89F25689 F046895A 169C468D F08BFFDF
00650064 00630058 0055004F 00441C67 FF2EFE94 E90374F9 E0073B2E 4343000E
5E245E24 5E245D60 5EB35E20 5DF75E1C 5DB10078 00750073 0072006F 00670066
4689D8F7 0E7D00DC 7E83DC46 89058B02 F84683F8 7EC55DAD 5D9C5E5D 5ECB5DA9
FC468908 C4830014 5F949AFC 76FFFE76 FFDC76FF 0A6A2D05 C6FC46FF FC7EC5DC

F87EC5ED EB106AF1 EB086ADC EB35FF02 F84683F8 7EC50A6A 0148E9FE 568901FE
89DC4689 00DA83D8 F7DAF716 7900DE7E 8304F846 83DE5689 DC468902 558B058B
C4830014 600A9AFC 76FFFE76 FFDC76FF DE76FF0A 6A2D05C6 FC46FFFC 7EC5DE56
5689FC46 890AC483 0014600A 9AFC76FF FE76FF35 FF0275FF F87EC50A 6A9CEB0A
76FF086A 08EC83EA 76FFFC76 FFFE76FF D5EB106A D9EB086A 00C8E904 F84683FE
89FC4689 10C48300 146BEE9A 560AC483 00148896 9A500008 05C48B16 F876FFFA
0875C20B F65689F4 46890255 8B058BF8 7EC50000 E446C700 87E908F8 4683FE56
7EC5FE56 89FC4689 F25689F0 4689F656 8BF4468B 04F84683 F64E8C60 AEF446C7
C731EBFC 4EFFE47E EA463BF4 462BFC46 8BEF7C00 EA7E8311 74003D80 FC46FFFC
FF35FF02 75FFF87E C519EB05 88FC46FF FC7EC505 8B02F846 83F87EC5 0000E446
0BE64689 FC462BE8 4603F256 8BF0468B FF31E908 C4830014 5B7C9A0A 76FF0C76
2D3D80F0 7EC51E75 30EC7E83 247400E4 7E833F75 00EE7E83 0000E646 C7057DC0
C00BE64E FFE6468B 06C48300 1496649A 50E42A05 8AF046FF 0A76FF0C 76FF1675
7EC50A76 FF0C76FF 1B73FC46 3BF2568B F0468BE3 EBEC76FF 0A76FF0C 76FF0B74
FFE6468B FC30E903 7500EE7E 83DAEB06 C4830014 96649A50 E42A058A F046FFF0
CB5E5FC9 E0EB06C4 83001496 649AEC76 FF0A76FF 0C76FFFC 23E90375 C00BE64E

8B0007C6 FC5EC5FC 4EFFFE56 89FC4689 5A16FC46 8D0E768B 00000EC8 575601FE
5EC5FC4E FF9860B6 878A2EDA 8B1076F7 D22BC68B 1B74C00B F88B1076 F7D22BC6
FF0F7400 3F80FC5E C50788FC 5EC5FC4E FF9860B6 878A2EDE 8BD8EBF7 8B0788FC
768B0000 16C85756 CB5E5FC9 0C568B0A 468BE7EB 0A46FF0A 5EC5E42A 078AFC46
0E76FF10 76FF5052 99C68B00 05C6EA7E C5EA4EFF EC5689EA 46895A16 FF468D12
89D29A0E 76FF1076 FF505299 C68B3174 C20BF056 89EE4689 08C48300 148A1E9A
56890E46 89F0568B EE468B05 88EA7EC5 EA4EFF98 60B6858A 2EF88B08 C4830014
46FF0F74 003D80EA 7EC50588 EA7EC5EA 4EFF9860 B6858A2E F88B0E46 8BB2EB10
4C554E7B 001C0BBE 00CB5E5F C90C568B 0A468BE7 EB0A46FF 0A7EC5E4 2A058AEA
46C60AE8 46C60000 28C85756 46454443 42413938 37363534 33323130 00007D4C
46C64DF0 46C65FEF 46C646EE 46C649ED 46C65FEC 46C653EB 46C64DEA 46C646E9
7E83F646 895E5F00 1473FC9A 50FA468D 16036A57 560000E0 46C758F2 46C642F1
0014745C 9A50FA46 8D16006A 50E8468D 16F676FF 57560161 E9FA468B 067400FA
7E83E446 895E5F00 14731C9A 50FA468D 164E6A57 56D97500 FA7E83F4 46895E5F
520A76FF 0C76FF00 05C6FC7E C5FE5689 FC468902 C4830014 A7029A50 C07500FA
45881246 8B0C4588 10468B0B 4588FC7E C50E468B 08C48300 14A6629A 50001405

C7000048 45C70000 4645C712 45891846 8B105589 0E458916 568B1446 8B0D01FE
45E90374 00FA7E83 E246895E 5F001472 9C9A50FA 468D16E0 76FF5756 00004A45
56FF27E9 037400FA 7E835E5F 0014743C 9A50FA46 8D1650E4 76FFF476 FF5756FF
037400FA 7E83DE46 895E5F00 14741C9A 50FA468D 1650D846 8D16FF6A E276FF57
FF5756FE E9E90374 00FA7E83 5E5F0014 72BC9A50 FA468D16 E476FF57 56FF03E9
830014A7 029ADE76 FFFECFE9 037400FA 7E835E5F 0014727C 9A50FA46 8D16E276
5F001472 BC9A50FA 468D16DE 76FF5756 F8468905 8BDA7EC5 DC5689DA 468902C4
C646E946 C60AE846 C6000028 C85756CB 5E5FC9F8 468BFE9C E9037400 FA7E835E
C642F146 C64DF046 C65FEF46 C646EE46 C649ED46 C65FEC46 C653EB46 C64DEA46
7400FA7E 83F64689 5E5F0014 73FC9A50 FA468D16 036A5756 0000E046 C758F246
895E5F00 14745C9A 50FA468D 16006A50 E8468D16 F676FF57 560164E9 FA468B06
7500FA7E 83E44689 5E5F0014 731C9A50 FA468D16 4E6A5756 D97500FA 7E83F446
00140552 0A76FF0C 76FF0005 C6FC7EC5 FE5689FC 468902C4 830014A7 029A50C0
468B0D45 8812468B 0C458810 468B0B45 88FC7EC5 0E468B08 C4830014 A6629A50
891E468B 48558946 45891C56 8B1A468B 12458918 468B1055 890E4589 16568B14
56FF42E9 037400FA 7E83E246 895E5F00 14729C9A 50FA468D 16E076FF 57564A45

56FF24E9 037400FA 7E835E5F 0014743C 9A50FA46 8D1650E4 76FFF476 FF5701FE
037400FA 7E83DE46 895E5F00 14741C9A 50FA468D 1650D846 8D16FF6A E276FF57
FF5756FE E6E90374 00FA7E83 5E5F0014 72BC9A50 FA468D16 E476FF57 56FF00E9
830014A7 029ADE76 FFFECCE9 037400FA 7E835E5F 0014727C 9A50FA46 8D16E276
5F001472 BC9A50FA 468D16DE 76FF5756 F8468905 8BDA7EC5 DC5689DA 468902C4
1476FF16 76FF1876 FF000002 C85756CB 5E5FC9F8 468BFE99 E9037400 FA7E835E
006A1174 C00BFE46 8910C483 001460C6 9A0A76FF 0C76FF0E 76FF1076 FF1276FF
0AE846C6 000028C8 5756CB5E 5FC9FE46 8B0AC483 00149250 9A50036A 006A006A
4DF046C6 5FEF46C6 46EE46C6 49ED46C6 5FEC46C6 53EB46C6 4DEA46C6 46E946C6
F646895E 5F001473 FC9A50FA 468D1603 6A575600 00E046C7 58F246C6 42F146C6
745C9A50 FA468D16 006A50E8 468D16F6 76FF5756 0180E9FA 468B0674 00FA7E83
46895E5F 0014731C 9A50FA46 8D1600B4 685756D9 7500FA7E 83F44689 5E5F0014
FF0C76FF 0105C6FC 7EC5FE56 89FC4689 02C48300 14A7029A 50BF7500 FA7E83E4
468B0C45 8810468B 0B4588FC 7EC50E46 8B08C483 0014A662 9A500014 05520A76
89464589 1C568B1A 468B1245 8918468B 1055890E 45891656 8B14468B 0D458812
2C00029A 666A2076 FF2276FF 50004E05 FC468BFE 76FF5756 4A45891E 468B4855

E9037400 FA7E83E2 46895E5F 0014729C 9A50FA46 8D16E076 FF57565E 5F0001FE
FF08E903 7400FA7E 835E5F00 14743C9A 50FA468D 1650E476 FFF476FF 5756FF26
7400FA7E 83DE4689 5E5F0014 741C9A50 FA468D16 50D8468D 16FF6AE2 76FF5756
5756FECA E9037400 FA7E835E 5F001472 BC9A50FA 468D16E4 76FF5756 FEE4E903
0014A702 9ADE76FF FEB0E903 7400FA7E 835E5F00 14727C9A 50FA468D 16E276FF
001472BC 9A50FA46 8D16DE76 FF5756F8 4689058B DA7EC5DC 5689DA46 8902C483
9A056A50 FE468D16 000002C8 5756CB5E 5FC9F846 8BFE7DE9 037400FA 7E835E5F
249A056A 50FE468D 16000002 C85756CB 5E5FC900 0225FE46 8B06C483 00149024
C700000A C85756CB 5E5FC900 02B803EB 0004B805 740001FE 46F706C4 83001490
50575643 7500F67E 83FC4689 5E5F0014 73FC9A50 F6468D16 016A5756 0000F646
7500F67E 83FE4689 5E5F0014 745C9A50 F6468D16 006A6BC6 36FF2E6B C836FF2E
02EB0001 B8057500 013D0245 8BF87EC5 FA5689F8 468902C4 830014A7 029A501F
50F8468D 16016A57 561D7500 0A7E8300 00F846C7 000008C8 5756CB5E 5FC9C02B
FF2E6BC8 36FF2E0A 76FF5756 3BEBC02B 047400F8 7E830A46 895E5F00 1473FC9A
0014A702 9A50D675 00F87E83 FE46895E 5F001474 5C9A50F8 468D1600 6A6BC636
57560000 F646C700 000AC857 56CB5E5F C90C458B FA7EC5FC 5689FA46 8902C483

FF57563B EBC02B04 7400F67E 83FC4689 5E5F0014 73FC9A50 F6468D16 016A01FE
F67E83FE 46895E5F 0014745C 9A50F646 8D16006A 6BC636FF 2E6BC836 FF2EFC76
08C85756 CB5E5FC9 04458BF8 7EC5FA56 89F84689 02C48300 14A7029A 50D67500
36FF2E00 6A006A04 6A50FA46 8D16066A FE46890A 6EF70C46 8B0000F8 46C70000
468B06EB D08BC02B 067400F8 7E83F846 8910C483 001460C6 9A6BCA36 FF2E6BCC
6AFC5689 FA46890C 568B0A46 8B0000F8 46C70000 08C85756 CB5E5FC9 FC568BFA
468910C4 83001460 C69A6BCE 36FF2E6B D036FF2E 006A006A 026A50FA 468D1606
6BD236FF 2E6BD436 FF2E006A 006A036A 006A006A 006AEC8B 555756CB 5E5FC9F8
36FF2E00 6A006A03 6A006A00 6A006AEC 8B555756 CB5E5FC9 10C48300 1460C69A
000005C7 0C7EC500 0008C857 56CB5E5F C910C483 001460C6 9A6BD636 FF2E6BD8
5F001474 5C9A0C76 FF0E76FF 006A6BDA 36FF2E6B DC36FF2E 50001467 7F9A5756
7EC5FC46 895E5F00 1473FC9A 570E76FF 016A5756 3A75003D 830C7EC5 FE46895E
5E8EF803 E7D10A7E 8BFA5689 F8468902 C4830014 A7029AFE 76FF2075 003D830C
2E500014 677F9A57 56000005 C70C7EC5 000008C8 5756CB5E 5FC90589 FC468BFA
3D830C7E C5FE4689 5E5F0014 745C9A0C 76FF0E76 FF006A6B DA36FF2E 6BDC36FF
74003D83 FC5E8EF8 03E7D10A 7E8BFC56 89FA4689 02C48300 14A7029A 50237500

6BDE3EC5 2E575600 00F646C7 00000AC8 5756CB5E 5FC9C02B 02EB0001 B80501FE
57561074 00F67E83 FE46895E 5F001474 1C9A50F6 468D1650 FC468D16 FF6A35FF
C5FA5689 F8468902 C4830014 A7029AFE 76FF5E5F 001472DC 9A50F646 8D16006A
14A71E9A 5E5F0014 739C9A50 F6468D16 016AFC76 FF57561A 7500023D 058BF87E
F646C700 0014C857 56CB5E5F C95E5F00 1472DC9A 50F6468D 16006A57 5610EB00
5F001473 FC9A50EC 468D1601 6A575600 00EC46C7 0000F046 C70000EE 46C7000A
3EC52E5E 5F001473 FC9A50EC 468D1600 6A575600 E7E90374 00EC7E83 FC46895E
8D16006A 6BC636FF 2E6BC836 FF2EFC76 FF575600 C7E90374 00EC7E83 05896BE2
8902C483 0014A702 9A50009E E9037400 EC7E83FE 46895E5F 0014745C 9A50EC46
EC7E8305 896BDE3E C52E5E5F 0014729C 9A50EC46 8D16F676 FF5756FA 5689F846
2AF3468A 587500EC 7E83F346 885E5F00 1473DC9A 50EC468D 16006A57 56717500
E42AF346 8A5756F3 468800C1 B803EBFF FD05E42A F3468A0A 7600C13D FFFD05E4
46895E5F 001472FC 9A50EC46 8D16006A 040068EE 76FFF076 FF006A69 96680E50
0002C857 56CB5E5F C9EC468B 0A4589F8 7EC5058B 6BDE3EC5 2E0D7500 EC7E83F4
FF006A6B EA36FF2E 6BEC36FF 2E500014 677F9A57 56307500 3D836BE6 3EC52E00
3EC52E57 561D7500 3D830A7E C505896B E63EC52E 5E5F0014 745C9A0A 76FF0C76

5756CB5E 5FC9FE46 895E5F00 14747C9A 0A76FF0C 76FFFF6A 016A35FF 6BE601FE
00CB5E5F C95E5F00 14739C9A 0A76FF0C 76FF016A 35FF6BE6 3EC52E57 56EC8B55
001C107E 001C107C 001C105A 001C104A 001C103A 001C1034 001C102C 001C1064
F88B08C4 83001488 CC9A0014 875F9A0C 46DD0000 4EC85756 001C1070 001C107A
F8468918 568B1646 8B2474C2 0BFE5689 FC468970 16958B2E 7014858B 2E02E7C1
7D00147E 8301DCE9 EB75C00A 0588F846 FFF87EC5 98058AFC 46FFFC7E C5FA5689
0014875F 9A0C46DD 1476FF50 F6468D16 50F4468D 1650B446 8D160006 1446C705
F87EC5FA 5689F846 895C7567 0A7E83FE 5689FC46 8918C483 00146E28 9A0A76FF
FF7D80F8 7EC50E74 FC463B05 75FE563B FA568BF8 468BF3EB F846FF05 74003D80
C7077DF6 463B0005 05087CFD F67E83B2 4689FC46 2BF8468B E2EBF84E FF057530
83FA5689 F8468918 568B1646 8B000014 46C7057C B2463BF6 468B0DEB 00650A46
98058AFC 46FFFC7E C500A5E9 0374650A 7E832D05 C6F846FF F87EC509 7400F47E
F846FFF8 7EC5F64E FF037400 14875A9A 6FF41EDC 2E0C46DD 0588F846 FFF87EC5
FFF87EC5 0030B803 EB98058A FC46FF08 74003D80 FC7EC520 7E00147E 832E05C6
05C6F846 FFF87E8B 0B7C00F6 7E836505 C6F846FF F87EC5DA EB144EFF 0588F846
76FFFA76 FF70B268 0EF6[illegible]F F64689D8 F7F6468B 2D05C6F8 46FFF87E C511EB2B 7E837BEB F8460104 C4830014 A6949AF8 76FFFA76 FF0AC483 00145B38 9AF801FE
B803EB98 058AFC46 FF087400 3D80FC7E C520EB30 05C6F846 FFF87EC5 0B7F00F6
7E832E05 C6F846FF F87EC544 7400147E 83E075F6 4EFF0588 F846FFF8 7EC50030
74003D80 FC7EC51B EB3005C6 F846FFF8 7EC50B7D C00BF646 FFF6468B 357E0014
9BFA568B F8468BC5 EB144EFF 0588F846 FFF87EC5 0030B803 EB98058A FC46FF08
000007C7 1A5EC547 72001487 5A9A6FF4 1EDC2E0C 46DD0000 12C85756 CB5E5FC9
89FC4689 20568B1E 468B0000 07C7165E C5407500 14875A9A 6FF41EDC 2E0C46DD
0164E900 07C6FC5E C5EBEB30 07C6FC46 FFFC5EC5 0B74C00B 144EFF14 468BFE56
14884F9A 0014875F 9A0C46DD 50F6468D 160C5EDD E0D90C46 DD000107 C71A5EC5
9A50FA46 8908C483 001487BF 9A001487 5F9A6FFC 36DC2EF6 46DFD8DD 0CC48300
EBFA46FF 05720014 875A9A70 041EDC2E 0C46DD0C 5EDD0C7E DC02C483 001488E8
1487BF9A 0014875F 9A0C46DD 0789165E C5FA468B 0C5EDD0C 4EDC700C 06DD2E0B
7E831774 660A7E83 F8468914 468BFE56 89FC4689 20568B1E 468BF08B 08C48300
14468B04 EB144603 FA468B08 7CFA463B 00050514 468B137C 00FA7E83 1975670A
7DF87E3B FF2B0011 F846C705 7E11F87E 830000F8 46C7057D 00F87E83 F8468940
EE66DC0C 46DDEE5E DD02C483 0014876D 9A560788 003005C6 8BFC46FF FC5EC53C C5BFEB47 F08B08C4 83001487 BF9A0014 875F9A0C 46DD0C5E DD700C0E DC2E01FE
FC5EC5FC 4EFF1874 1E463B05 7520563B FE568BFC 468B3C7C 05FE8300 07C6FC5E
07C6FC5E 03F85E8B 3107C6FC 5EC5D8EB 3007C6FC 5EC51C7E 00393D98 078A07FE
934F0979 A3710000 00000000 000000CB 5E5FC99B 20568B1E 468B07FF 165EC500
70760014 70690014 70610014 70544024 00000000 00003FF0 00000000 0000400A
00000000 00000000 00000000 00000014 708B0000 00000014 707E0000 00000014
7B007D6C 616D726F 6E6E5520 2B7B0000 00000014 70A50000 00000014 70980000
49202B7B 007D4E41 4E202D7B 007D6C61 6D726F6E 6E55202D 7B007D4E 414E202B
616D726F 6E654420 2B7B007D 7974696E 69666E49 202D7B00 7D797469 6E69666E
0A75C923 08B80000 9AEC8B55 00007525 007D6C61 6D726F6E 6544202D 7B007D6C
0A75C923 08A80000 9AEC8B55 00EDEB00 1472169A D2320002 CA5D0F89 26065EC4
0A75C923 08F00000 9AEC8B55 00EDEB00 1472169A D2320008 CA5D0F89 26065EC4
0A75C923 08680000 9AEC8B55 00EDEB00 1472169A D232000C CA5D0F89 26065EC4
0A75C923 08580000 9AEC8B55 00EDEB00 1472169A D232000A CA5D0F89 26065EC4
0A75C923 08700000 9AEC8B55 00EDEB00 1472169A D2320008 CA5D0F89 26065EC4
0A75C923 08780000 9AEC8B55 00EDEB00 1472169A D2320006 CA5D0F89 26065EC4

C9230820 00009AEC 8B5500ED EB001472 169AD232 0006CA5D 0F892606 5EC401FE
C92308E0 00009AEC 8B5500ED EB001472 169AD232 0006CA5D 0F892606 5EC40A75
C9230860 00009AEC 8B5500ED EB001472 169AD232 0006CA5D 0F892606 5EC40A75
C92308E8 00009AEC 8B5500ED EB001472 169AD232 0008CA5D 0F892606 5EC40A75
5050C033 52511179 C90B00ED EB001472 169AD232 000CCA5D 0F892606 5EC40A75
07C72606 5EC41F04 9000009A 1EEC8B55 00CBFFFF B8001472 309A5306 065EC450
02FB800B EB1A7280 00F98108 7501FB80 2574DB0A 0A5E8BEC 8B55000E CA5D0000
1EEC8B55 0006CAFF FFB85D59 5A065EFF 006A006A 52515251 0D738000 F9810675
1EEC8B55 00EFEB00 1472469A 0006CA5D 0F892606 5EC40A75 C9231F03 6000009A
1EEC8B55 00EFEB00 1472469A 0006CA5D 0F892606 5EC40A75 C9231F03 1800009A
1EEC8B55 00EFEB00 1472469A 0006CA5D 0F892606 5EC40A75 C9231F03 7000009A
1EEC8B55 00EFEB00 1472469A 0006CA5D 0F892606 5EC40A75 C9231F03 8000009A
1EEC8B55 00EFEB00 1472469A 0014CA5D 0F892606 5EC40A75 C9231F03 3800009A
1EEC8B55 00EFEB00 1472469A 0006CA5D 0F892606 5EC40A75 C9231F03 2800009A
1EEC8B55 00EFEB00 1472469A 0006CA5D 0F892606 5EC40A75 C9231F03 7800009A
1EEC8B55 00EFEB00 1472469A 000ACA5D 0F892606 5EC40A75 C9231F03 3000009A

8B5500EF EB001472 469A000C CA5D0F89 26065EC4 0A75C923 1F02E000 009A01FE
8B5500EF EB001472 469A0006 CA5D0F89 26065EC4 0A75C923 1F046000 009A1EEC
8B5500EF EB001472 469A000A CA5D0F89 26065EC4 0A75C923 1F04B000 009A1EEC
8B5500EF EB001472 469A0006 CA5D0F89 26065EC4 0A75C923 1F03F000 009A1EEC
8B5500EF EB001472 469A0006 CA5D0F89 26065EC4 0A75C923 1F040000 009A1EEC
8B5500EF EB001472 469A000C CA5D0F89 26065EC4 0A75C923 1F043000 009A1EEC
8B5500EF EB001472 469A000A CA5D0F89 26065EC4 0A75C923 1F045800 009A1EEC
8B5500EF EB001472 469A000C CA5D0F89 26065EC4 0A75C923 1F041800 009A1EEC
8B5500EF EB001472 469A000A CA5D0F89 26065EC4 0A75C923 1F043800 009A1EEC
8B5500EF EB001472 469A0006 CA5D0F89 26065EC4 0A75C923 1F04A000 009A1EEC
8B5500EF EB001472 469A0008 CA5D0F89 26065EC4 0A75C923 1F03D000 009A1EEC
8B5500EF EB001472 469A0008 CA5D0F89 26065EC4 0A75C923 1F046800 009A1EEC
8B5500ED EB001472 169AD232 000ECA5D 0F892606 5EC40A75 C9230578 00009AEC
8B5500ED EB001472 169AD232 000ACA5D 0F892606 5EC40A75 C9230600 00009AEC
575600ED EB001472 169AD232 000ACA5D 0F892606 5EC40A75 C9230650 00009AEC
76FF3076 FF50D046 8D160A76 FF0C76FF 575600FF B246C700 00B446C7 00005CC8

2EE42A05 88267EC5 D2468B02 78E90374 003D832E 7EC55E5F 00149AB6 9A2E01FE
DD9B02C4 83001487 759A50E4 2AD1468A C65EDD9B 79A806DF 2E9B0588 79A43EC5
9B001487 5F9ABE46 DD9B0589 79AA3EC5 2E08C483 001487BF 9A001487 5F9ABE56
9BC646DD 9BA45EDD 9BE8D99B C65EDD9B 10C48300 1497F29A 0014875F 9AC646DD
2B0008B8 F88BE42A D1468A05 882A7EC5 08C48300 1487DA9A 0014875F 9AA466DC
D99B0E7E C5058879 AE3EC52E E42A0588 E0D3B04E 8BE42A05 8A2A7E8B B04689C7
9BF876DC 9BE846DD 9B1DD99B 79B63EC5 2E05D99B 127EC51D D99B79B2 3EC52E05
127EC5B6 46D99B1D D99B0E7E C5BA46D9 9BB65ED9 9BF076DC 9BE046DD 9BBA5ED9
76D89BD8 46DB9B1D D99B79BA 3EC52E15 D99B167E C5BA76D8 9BDC46DB 9B1DD99B
0CD8269B 05D99B79 BA3EC52E 79B236C4 2E1DD99B 79BE3EC5 2E15D99B 1A7EC5B6
D99B79BE 3EC52E79 B636C42E 058979C2 3EC52E08 C4830014 87BF9A00 14875F9A
CA3EC52E DC468B05 8979C63E C52E08C4 83001487 BF9A0014 875F9A0C D8269B05
C61DD99B 79DA3EC5 2E79D206 DD2E9B1D D99B79CE 3EC52E79 D206DD2E 9B058979
B476FFB2 76FF0255 89058979 DE3EC52E 04C48300 14A2899A 01006824 6A01CE46
79DE3EC5 2E05892E 7EC50EC4 8300149E C59A0A76 FF0C76FF 50E42ACE 468A5052
04C48300 14A2899A 5040058B 79CA3EC5 2E026A02 55890589 227EC502 558B058B

1E7EC504 C4830014 A2899A35 FF79C23E C52E046A 02558905 8979E23E C52E01FE
76FF3076 FF79E636 FF2E79E8 36FF2E00 6A026A0A 76FF0C76 FF575602 55890589
C52E5756 33EBAE56 89AC4689 D08BC02B 0C74003D 832E7EC5 5E5F0014 99CF9A2E
FF3076FF 016A006A 79DA36FF 2E79DC36 FF2EAC76 FFAE76FF 35FF0275 FF79E63E
560000FE 46C70000 0EC85756 CB5E5FC9 9B003D83 2E7EC55E 5F001499 E49A2E76
1650FC46 8D1650FE 468D1679 EA36FF2E 79EC36FF 2E35FF02 75FF79E6 3EC52E57
FEE90374 003D8314 7EC55E5F 001499F9 9A1476FF 1676FF50 F6468D16 50FA468D
E23EC52E 00C2E903 77FC463B F44689FF FF05FE46 03FA468B FE46FF02 FA6E8300
F2468940 FE462BFC 468B0589 107EC5FA 468B0255 8905890C 7EC50255 8B058B79
558B0503 E0D1FE46 8B79EA3E C52E35FF 0275FF79 E23EC52E 57562774 00F27E83
2E35FF02 75FF79E6 3EC52E57 56FA4629 F2468B5E 5F003400 029AF276 FF505202
5E5F0014 9A0E9A14 76FF1676 FF50FC46 8D1650FE 468D1679 EA36FF2E 79EC36FF
5202558B 0503E0D1 F2468B79 E23EC52E 57565174 00FA7E83 5775003D 83147EC5
C42E21EB 5E5F0034 00029AFA 76FF5052 02558B05 03E0D1FE 468B79EA 3EC52E50
C9058910 7EC5FA46 8B025589 05890C7E C502548B 26040326 E0D1FE46 8B79EA36
5F00149A 239A50FE 468D1635 FF0275FF 79E63EC5 2E575600 0002C857 56CB5E5F

9A35FF02 75FF79E2 3EC52E04 C4830014 A2CB9A35 FF0275FF 79DE3EC5 2E5E01FE
10D0001C 10CC001C 10F4001C 10F60002 001C10F2 00CB5E5F C904C483 0014A2CB
00000000 0000001C 10E4001C 10F0001C 10EC001C 10EE001C 10D8001C 10D4001C
68DF9A00 6AEC8B55 5756001C 10FC001C 10E0001C 10DC001C 10F8001C 10E83FF0
8B555756 CB5E5FC9 02C4830F 8868DF9A 016AEC8B 555756CB 5E5FC902 C4830F88
5FC902C4 830F8868 DF9A036A EC8B5557 56CB5E5F C902C483 0F8868DF 9A026AEC
8868DF9A 056AEC8B 555756CB 5E5FC902 C4830F88 68DF9A04 6AEC8B55 5756CB5E
EC8B5557 56CB5E5F C902C483 0F8868DF 9A066AEC 8B555756 CB5E5FC9 02C4830F
5E5FC902 C4830F88 68DF9A08 6AEC8B55 5756CB5E 5FC902C4 830F8868 DF9A076A
0F8868DF 9A0A6AEC 8B555756 CB5E5FC9 02C4830F 8868DF9A 096AEC8B 555756CB
6AEC8B55 5756CB5E 5FC902C4 830F8868 DF9A0B6A EC8B5557 56CB5E5F C902C483
CB5E5FC9 02C4830F 8868DF9A 0D6AEC8B 555756CB 5E5FC902 C4830F88 68DF9A0C
830F8868 DF9A0F6A EC8B5557 56CB5E5F C902C483 0F8868DF 9A0E6AEC 8B555756
116AEC8B 555756CB 5E5FC902 C4830F88 68DF9A10 6AEC8B55 5756CB5E 5FC902C4
56CB5E5F C902C483 0F8868DF 9A126AEC 8B555756 CB5E5FC9 02C4830F 8868DF9A
C4830F88 68DF9A14 6AEC8B55 5756CB5E 5FC902C4 830F8868 DF9A136A EC8B5557

6AEC8B55 5756CB5E 5FC902C4 830F8868 DF9A156A EC8B5557 56CB5E5F C90201FE
CB5E5FC9 02C4830F 8868DF9A 176AEC8B 555756CB 5E5FC902 C4830F88 68DF9A16
830F8868 DF9A196A EC8B5557 56CB5E5F C902C483 0F8868DF 9A186AEC 8B555756
1B6AEC8B 555756CB 5E5FC902 C4830F88 68DF9A1A 6AEC8B55 5756CB5E 5FC902C4
56CB5E5F C902C483 0F8868DF 9A1C6AEC 8B555756 CB5E5FC9 02C4830F 8868DF9A
C4830F88 68DF9A1E 6AEC8B55 5756CB5E 5FC902C4 830F8868 DF9A1D6A EC8B5557
9A206AEC 8B555756 CB5E5FC9 02C4830F 8868DF9A 1F6AEC8B 555756CB 5E5FC902
5756CB5E 5FC902C4 830F8868 DF9A216A EC8B5557 56CB5E5F C902C483 0F8868DF
02C4830F 8868DF9A 236AEC8B 555756CB 5E5FC902 C4830F88 68DF9A22 6AEC8B55
DF9A256A EC8B5557 56CB5E5F C902C483 0F8868DF 9A246AEC 8B555756 CB5E5FC9
555756CB 5E5FC902 C4830F88 68DF9A26 6AEC8B55 5756CB5E 5FC902C4 830F8868
C902C483 0F8868DF 9A286AEC 8B555756 CB5E5FC9 02C4830F 8868DF9A 276AEC8B
68DF9A2E 6AEC8B55 5756CB5E 5FC902C4 830F8868 DF9A2D6A EC8B5557 56CB5E5F
8B555756 CB5E5FC9 02C4830F 8868DF9A 2F6AEC8B 555756CB 5E5FC902 C4830F88
5FC902C4 830F8868 DF9A316A EC8B5557 56CB5E5F C902C483 0F8868DF 9A306AEC
8868DF9A 336AEC8B 555756CB 5E5FC902 C4830F88 68DF9A32 6AEC8B55 5756CB5E

```
555756CB 5E5FC902 C4830F88 68DF9A34 6AEC8B55 5756CB5E 5FC902C4 830F01FE
C902C483 0F8868DF 9A366AEC 8B555756 CB5E5FC9 02C4830F 8868DF9A 356AEC8B
68DF9A38 6AEC8B55 5756CB5E 5FC902C4 830F8868 DF9A376A EC8B5557 56CB5E5F
8B555756 CB5E5FC9 02C4830F 8868DF9A 396AEC8B 555756CB 5E5FC902 C4830F88
5FC902C4 830F8868 DF9A3B6A EC8B5557 56CB5E5F C902C483 0F8868DF 9A3A6AEC
8868DF9A 3D6AEC8B 555756CB 5E5FC902 C4830F88 68DF9A3C 6AEC8B55 5756CB5E
EC8B5557 56CB5E5F C902C483 0F8868DF 9A3E6AEC 8B555756 CB5E5FC9 02C4830F
5E5FC902 C4830F88 68DF9A40 6AEC8B55 5756CB5E 5FC902C4 830F8868 DF9A3F6A
E046C608 DF46C601 DE46C600 0FDC46C7 04DB46C6 00DA46C6 000026C8 575600CB
8908C483 001487F5 9A001487 5F9A0CD8 269B05D9 9B167EC5 0E76C400 E146C600
F59A0014 875F9A0C D8269B05 D99B1A7E C51276C4 05898260 3EC52EE8 5689E646
127EC5F2 5EDD9B05 D99B0E7E C5058982 643EC52E E45689E2 468908C4 83001487
0CC48300 1482B49A 0A76FF0C 76FF50DA 468D1626 76FF2876 FFEA5EDD 9B05D99B
8B158914 03268268 3EF72E99 058B8260 3EC52E82 6036C42E 6F75003D 83267EC5
6E36FF2E 827036FF 2E2676FF 2876FF02 55890589 826A3EC5 2E99C68B 02E6C135
FA46C71A 75003D83 267EC512 C4830014 84699A0A 76FF0C76 FF016A00 6A006A82

5756CB5E 5FC99B0A C4830014 7F909AFA 76FF2276 FF2476FF 572876FF 000001FE
FF2E50E4 2A058A82 823EC52E 1076FF12 76FFFE56 89FC4689 990A468B 000004C8
7436FF2E 827636FF 2E827836 FF2E827A 36FF2E82 7C36FF2E 827E36FF 2E828036
C52E826A 36C42E65 75003D83 107EC518 C4830014 80549A0A 76FF8272 36FF2E82
7EC50255 8B058B82 7A3EC52E 3073043B 26357707 7202543B 26D22B05 8B82763E
83001439 8A9AFC76 FFFE76FF 1076FF12 76FF0105 C682823E C52E0255 8905890C
5FC90005 C682823E C52E0255 8905890C 7EC50255 8B058B82 723EC52E 1AEB08C4
76FF1375 050B0245 8B82863E C52EFE46 89058B82 6A3EC52E 000008C8 5756CB5E
FF0C7EC5 575600E4 E9037401 1C7E8302 55890589 147EC502 C4830014 A23E9AFE
8BD22B05 8B107EC5 5E5F002C 00029A35 FF107EC5 35FF0275 FF147EC5 35FF0275
8A36C52E FA468905 8B187EC5 FC4689D1 1BC32B02 558B058B 826A3EC5 2ECA8BD8
2EFE4689 D11BC32B 02558B05 8B826A3E C52ECA8B D88BD22B C78B47F8 2B3C8B82
8836FF2E 571A76FF 56828C36 FF2E1E76 FF2076FF 0589187E C540058B 828A3EC5
0374003D 831E7EC5 14C48300 1484A29A 35FF0275 FF826E3E C52E8286 36FF2E82
058B107E C51476C4 50520254 8B260403 26058B18 7EC58286 36C42E57 5600F1E9
76FF0589 187EC5FF FF05FE46 8B5E5F00 2C00029A FC76FF50 5202548B 26040326

828636FF 2E828836 FF2E1876 FF1A76FF 828A36FF 2E828C36 FF2E1E76 FF2001FE
C5828636 C42E7C75 003D831E 7EC514C4 83001484 8F9A35FF 0275FF82 6E3EC52E
042B2605 8B828A3E C52E1876 C4025589 05890C7E C502548B 26040326 058B187E
187EC582 6A36C42E FA5689F8 4689D22B C78B473C 8B828A36 C52E0589 107EC540
8B187EC5 826A36C4 2E1577F8 463B1A77 0772FA56 3B025413 26040326 D22B058B
000002C8 5756CB5E 5FC90589 187EC505 8B187EC5 05EB0254 13260403 26D22B05
001484B5 9A35FF02 75FF826E 3EC52E82 7E36FF2E 828036FF 2E006A50 FE468D16
1106001C 110E0002 001C110A 001C110C CB5E5FC9 FE468B03 7400FE7E 830EC483
5756001C 111E001C 1102001C 1100001C 1112001C 1118001C 111C001C 1114001C
02C4830F 9868DF9A 016AEC8B 555756CB 5E5FC902 C4830F98 68DF9A00 6AEC8B55
DF9A036A EC8B5557 56CB5E5F C902C483 0F9868DF 9A026AEC 8B555756 CB5E5FC9
555756CB 5E5FC902 C4830F98 68DF9A04 6AEC8B55 5756CB5E 5FC902C4 830F9868
C902C483 0F9868DF 9A066AEC 8B555756 CB5E5FC9 02C4830F 9868DF9A 056AEC8B
68DF9A08 6AEC8B55 5756CB5E 5FC902C4 830F9868 DF9A076A EC8B5557 56CB5E5F
8B555756 CB5E5FC9 02C4830F 9868DF9A 096AEC8B 555756CB 5E5FC902 C4830F98
5FC902C4 830F9868 DF9A0B6A EC8B5557 56CB5E5F C902C483 0F9868DF 9A0A6AEC

DF9A0D6A EC8B5557 56CB5E5F C902C483 0F9868DF 9A0C6AEC 8B555756 CB5E01FE
555756CB 5E5FC902 C4830F98 68DF9A0E 6AEC8B55 5756CB5E 5FC902C4 830F9868
C902C483 0F9868DF 9A106AEC 8B555756 CB5E5FC9 02C4830F 9868DF9A 0F6AEC8B
68DF9A12 6AEC8B55 5756CB5E 5FC902C4 830F9868 DF9A116A EC8B5557 56CB5E5F
8B555756 CB5E5FC9 02C4830F 9868DF9A 136AEC8B 555756CB 5E5FC902 C4830F98
5FC902C4 830F9868 DF9A156A EC8B5557 56CB5E5F C902C483 0F9868DF 9A146AEC
9868DF9A 176AEC8B 555756CB 5E5FC902 C4830F98 68DF9A16 6AEC8B55 5756CB5E
EC8B5557 56CB5E5F C902C483 0F9868DF 9A186AEC 8B555756 CB5E5FC9 02C4830F
5E5FC902 C4830F98 68DF9A1A 6AEC8B55 5756CB5E 5FC902C4 830F9868 DF9A196A
0F9868DF 9A1C6AEC 8B555756 CB5E5FC9 02C4830F 9868DF9A 1B6AEC8B 555756CB
6AEC8B55 5756CB5E 5FC902C4 830F9868 DF9A1D6A EC8B5557 56CB5E5F C902C483
CB5E5FC9 02C4830F 9868DF9A 1F6AEC8B 555756CB 5E5FC902 C4830F98 68DF9A1E
830F9868 DF9A216A EC8B5557 56CB5E5F C902C483 0F9868DF 9A206AEC 8B555756
236AEC8B 555756CB 5E5FC902 C4830F98 68DF9A22 6AEC8B55 5756CB5E 5FC902C4
56CB5E5F C902C483 0F9868DF 9A246AEC 8B555756 CB5E5FC9 02C4830F 9868DF9A
C4830F98 68DF9A26 6AEC8B55 5756CB5E 5FC902C4 830F9868 DF9A256A EC8B5557
```

6AEC8B55 5756CB5E 5FC902C4 830F9868 DF9A276A EC8B5557 56CB5E5F C90201FE
CB5E5FC9 02C4830F 9868DF9A 296AEC8B 555756CB 5E5FC902 C4830F98 68DF9A28
830F9868 DF9A2B6A EC8B5557 56CB5E5F C902C483 0F9868DF 9A2A6AEC 8B555756
2D6AEC8B 555756CB 5E5FC902 C4830F98 68DF9A2C 6AEC8B55 5756CB5E 5FC902C4
56CB5E5F C902C483 0F9868DF 9A2E6AEC 8B555756 CB5E5FC9 02C4830F 9868DF9A
C4830F98 68DF9A30 6AEC8B55 5756CB5E 5FC902C4 830F9868 DF9A2F6A EC8B5557
9A326AEC 8B555756 CB5E5FC9 02C4830F 9868DF9A 316AEC8B 555756CB 5E5FC902
5756CB5E 5FC902C4 830F9868 DF9A336A EC8B5557 56CB5E5F C902C483 0F9868DF
02C4830F 9868DF9A 356AEC8B 555756CB 5E5FC902 C4830F98 68DF9A34 6AEC8B55
0A44681E 0AC036FF 1E57770B 6B0AC03E 815F731D 0A463E83 FFFEE481 CB5E5FC9
8D0D8A0A 4A9F8C0A 48BF890A C03E8BDB 03DB030A 461E8B0B BC068600 1470D69A
89AAC02A F2E2AA20 0402775A 3C067241 3CAC0EE3 7D2AAA01 74203CFC 071E0175
0A4A87C7 00000A48 87C7DB03 DB030A46 1E8B9A75 0D0BBC3E 800A4606 FF0AC03E
1F08C483 00149466 9A0A4668 1E0A4868 1E1ED88E 001CB800 14A18A9A ED2B0000
9A016A02 C4830014 A4EC9A50 0AC48300 142A3C9A 0A4636FF 0A48681E 006A006A
9B50521F DD36DC8B 08EC835A 58CB9EE0 DF9BE4D9 000207FF 0FBF00F4 001470B6

55CBC9FC 46DB0000 FE46C7FC 46890646 8B000004 C8CB5D06 46DFEC8B 55CB01FE
00FE46C7 0000FC46 C7FA4689 08468BF8 46890646 8B000008 C8CB5D06 46DBEC8B
2ED92EFE 7ED99B00 0004C8CB C9FC46D9 FC5ED906 46DD0000 04C8CBC9 F86EDF00
0646DD87 522ED92E FE7ED99B 000006C8 CBC9FC46 8BFE6ED9 FC5EDF06 46DD8752
6ED9FA5E DB0646DD 87522ED9 2EFE7ED9 9B000006 C8CBC9FA 468BFE6E D9FA5EDB
8BFE6ED9 F67EDF06 46DD8752 2ED92EFE 7ED99B00 000AC8CB C9FC568B FA468BFE
D90646DD 0E46DFEC 8B55CBC9 FC46D9FC 5ED90646 DD000004 C8CBC9F8 568BF646
D9C2DEE8 D9F9DE87 5606DF2E 0B740014 87589AF4 D90646DD EC8B55CB 5DD9DDFD
E9DCFCD9 C0D90646 DD87542E D92EFE7E D99B0000 02C8CB5D 9B1FDF26 0E5EC4C9
8BA4F3FC 0A7EC40E 76C509E3 124E8BEC 8B555756 00CBC9FE 6ED91FDD 260E5EC4
E989D2B8 0050E989 D2B80064 E98992B8 0061E989 92B800CB 5E5FC90C 568B0A46
551ECB5D 000F2508 0C027440 A84724C4 8AD8DDE0 DF9BE5D9 0646DDEC 8B550053
DDFCE2C9 DC115E06 DF40D9F7 0379C90B C02B1BE3 084E8BE8 D9D88E00 1CB8EC8B
55575680 00BA03EB 8001BA08 EBD22B0C EB0001BA CB1F5D11 5C3EDE04 74C00BD8
468B1056 8B06EB07 8B260257 8B260E5E C40C79FF 0BF62B53 0EFA8BD8 8B53EC8B
F7DAF708 79D20B0A 468B0C56 8B505246 0172EFD1 00DA83D8 F7DAF70C 79D20B0E

00CB5E5F C95B00DA 83D8F7DA F70773EE D10CC483 FA5EFF50 524600DA 83D801FE
F7260A46 8B50EC8B 55575608 5F8DDC8B C38BC08E D08C0BEB 085FC436 DC8BC38B
00CB5E5F C95BC78B D68BF003 27F7260C 468BF003 0267F726 0A468BF8 8BF28B27
7E8B0C76 8B50EC8B 55575608 5F8DDC8B C38BC08E D08C0BEB 085FC436 DC8BC38B
072B2607 72073B26 05770E72 02573B26 D2D1D0D1 D6D1E7D1 0020B9C0 2BD22B0A
5F8DDC8B C38BC08E D08C0BEB 085FC436 DC8BC38B 00CB5E5F C95BE2E2 02571B26
02773B26 D6D1D7D1 D2D1E0D1 0020B9FF 2BF62B0A 468B0C56 8B50EC8B 55575608
8B2E0000 04C85756 CB5E5FC9 5BE1E240 02771B26 3F2B2608 723F3B26 05770F72
0E76FC46 3B016805 8DE2168B 2E8DE006 8B2EFE56 89FC4689 8DE2168B 2E8DE006
0B75FE56 3B016805 8DE2168B 2E8DE006 8B2EE0EB 12FC4683 0674003D 83FC7EC5
8AD19A0A 76FF0C76 FF0E76FF 1076FFFC 76FFFE76 FF1AEBD0 8BC02B06 75FC463B
00148D2A 9A531476 FF137400 3F83125E C5000108 C85756CB 5E5FC90C C4830014
74C00BFA 46899807 8A0E46FF 0E5EC500 00FE46C7 F62B01C9 E90374C0 0B04C483
81067561 FA7E83D8 EB0002CE 81067577 FA7E83E4 EB0001CE 81067572 FA7E832F
868D160A 76FF0C76 FF017CE9 0375F60B C1EBFE46 FFC67562 FA7E83CC EB0004CE
75C00B08 C4830014 8D949A0A 76FF0C76 FF8DE468 0E08C483 0014A2E6 9A50FEFA

FC46895E 5F001471 369A50FE F8868D16 50FEFA86 8D165756 247402FE 832901FE
5F001471 D69A50FE F8868D16 50FEFA86 8D165756 187504FE 831D7521 FEF8BE83
6A006A04 6AFC76FF 57561875 04FE8301 04E900BF E9037500 FEF8BE83 FC46895E
47890647 89D08BC0 2B0E4789 125EC5FC 468B5E5F 001471F6 9A50FEF8 868D1600
C5077503 FE830574 01FE8300 0007C7FF FF0447C7 00000247 C70C5789 0A478908
00FE7E83 00030F81 125EC507 7504FE83 057403FE 830A7402 FE830004 0F81125E
C50974C0 0B08C483 00148D94 9A0A76FF 0C76FF8D EB680E00 080F8112 5EC50774
5EC50774 C00B08C4 8300148D 949A0A76 FF0C76FF 8DF0680E 1DEB0200 0F81125E
EB0003BF 057503FE 830DEB00 01BF0575 01FE834C EB14568B 12468B04 000F8112
037500FE F8BE835E 5F001471 169A50FE F8868D16 006A57FC 76FF5756 0002BF03
C85756CB 5E5FC9D0 8BC02B5E 5F001471 769A50FE F8868D16 FC76FF57 56FF0EE9
3E74C00B F08B0245 2B0080B8 4A740A45 3B0C458B 52740001 05F70A7E C5000002
7EC50C74 00FE7E83 5E5F0014 70F69A50 FE468D16 560A75FF 0C75FF0E 75FF5756
C02B0080 0245C708 55890645 890C558B 0A458B0A 7EC516EB FFFFB800 200D810A
FF0A7EC5 5756F08B 04C48300 148CC39A 0A76FF0C 76FF0000 02C85756 CB5E5FC9
00147176 9A50FE46 8D160E75 FF0A7EC5 57565E5F 00147156 9A50FE46 8D160E75

0014A2CB 9A0A75FF 0C75FF0E 75001005 F714740A 450B0C45 8B0A7EC5 5E5F01FE
F08B9807 8A0A46FF 0A5EC5EC 8B555756 CB5E5FC9 C68B0000 05C70A7E C504C483
7AFF8308 7C00613D F88B9807 8A0E46FF 0E5EC520 EE83037F 7AFE8308 7C00613D
001C0BBE CB5E5FC9 C02B02EB 0001B805 75FE3BC8 75F60B04 75FE3B20 EF83037F
76FF0C76 FF8F7C68 0EEC8B55 57560000 3A6F633A 003A6963 3A003A6B 726F773A
EC8B5557 56CB5E5F C904C483 00148CC3 9A0A76FF 0C76FF08 C4830014 5B1C9A0A
04C48300 148CC39A 0A76FF0C 76FF08C4 8300145B 1C9A0A76 FF0C76FF 8F81680E
AB8EA58E 918E5FA7 FF2ED88B E0D17977 00073D48 0E468BEC 8B555756 CB5E5FC9
0C76FF08 C4830014 5B1C9A0A 76FF0C76 FF900668 0E8EC98E C38EBD8E B78EB18E
EB08C483 00145B1C 9A0A76FF 0C76FF8F 86680E41 EB04C483 00148CC3 9A0A76FF
0ED2EB8F D6680ED8 EB8FC668 0EDEEB8F B6680EE4 EB8FA668 0EEAEB8F 96680ECA
0A76FF0C 76FF0E76 FFEC8B55 5756CB5E 5FC9FFFF B8C6EB8F F6680ECC EB8FE668
830014A6 949A1476 FF1676FF 1076FF12 76FF1476 FF1676FF 06C48300 148E489A
9A0A76FF 0C76FF90 0B680E0E 76FF5004 C4830014 A6949A10 76FF1276 FF5004C4
9A0A76FF 0C76FF08 C4830014 5B1C9A0A 76FF0C76 FF901E68 0E16C483 00145B1C
5098FF46 8A187F08 FF7E8001 FF46C600 0002C857 56CB5E5F C904C483 00148CC3

1B00426A 261B00CB 5E5FC9E2 EBFF46FE 06C48300 148E489A 0A76FF0C 76FF01FE
204C3364 316B3261 3066261B 00504F1B 204C3364 316B3161 3066261B 00406A26
204C3364 316B3461 3066261B 00524F1B 204C3364 316B3361 3066261B 00514F1B
204C3364 316B3661 3066261B 00544F1B 204C3364 316B3561 3066261B 00534F1B
204C3364 316B3861 3066261B 00564F1B 204C3364 316B3761 3066261B 00554F1B
426A261B 00732573 254C6425 6464256B 64256130 66261B00 426A261B 00574F1B
FF2E5057 56FC4689 5E5F0014 73FC9A50 FA468D16 036A5756 00000AC8 57560000
830014A7 029A50FE 46895E5F 0014745C 9A50FA46 8D16FF6A 924C36FF 2E924E36
AE909690 7FA7FF2E D88BE0D1 00A2E903 7600083D 480A468B F85689F6 468902C4
FF0E76FF F676FFF8 76FF246A 0085E9C0 2B910B90 FE90F190 E490D790 C990BC90
8BF876FF 106AE2EB 50002405 F6468BF8 76FF0A6A E3EB0AC4 83001488 969A0C76
047C05F6 468BF876 FF026AE2 EB003E05 F6468BF8 76FF043E 68F0EB00 2E05F646
76FF026A BBEB0482 05F6468B F876FF08 6AC8EB04 7E05F646 8BF876FF 046AD5EB
C85756CB 5E5FC900 01B8A1EB 048C05F6 468BF876 FF026AAE EB048A05 F6468BF8
FF2E924E 36FF2E50 5756FC46 895E5F00 1473FC9A 50FA468D 16036A57 5600000A
F6468902 C4830014 A7029A50 FE46895E 5F001474 5C9A50FA 468D16FF 6A924C36

91BD91A9 9191917A A7FF2ED8 8BE0D100 D3E90376 00083D48 0A468BF8 568901FE
9AF676FF F876FF0C 76FF0E76 FF246A00 B6E9C02B 9230921D 920A91F7 91E491D0
FF106AE2 EB500024 05F6468B F876FF0C 76FF0E76 FF0A6AE3 EB0AC483 00148896
05F6468B F876FF0C 76FF0E76 FF043E68 EAEB002E 05F6468B F876FF0C 76FF0E76
FF0C76FF 0E76FF04 6AC3EB04 7C05F646 8BF876FF 0C76FF0E 76FF026A D6EB003E
FF026A9D EB048205 F6468BF8 76FF0C76 FF0E76FF 086AB0EB 047E05F6 468BF876
8C05F646 8BF876FF 0C76FF0E 76FF026A 8AEB048A 05F6468B F876FF0C 76FF0E76
0000F046 C7FFFFF2 46C70000 1CC85756 001C1134 00CB5E5F C90001B8 FF76E904
56F64689 5E5F0014 73FC9A50 F4468D16 036A5756 01F1E9FF FFB80675 000A7E83
FF5756E8 46895E5F 0014745C 9A50F446 8D16FF6A 946236FF 2E946436 FF2E5057
575605EB 00C06857 5607750B 0C7E83E6 46895E5F 0014729C 9A50F446 8D16F076
5689FC46 8902C483 0014A702 9A50FA46 895E5F00 14731C9A 50F4468D 1600A068
75FE0A7E 833B7400 0E7E8303 45880E46 8B024588 0C468B0[illegible] 89FC7EC5 0A468BFE
76FF646A 1AEB5E5F 002C0002 9A046A10 76FF1276 FF5000C4 05FC468B 5257561B
76FF146A 68750B0C 7E830AC4 830014A5 909A5000 0405FC46 8BFE76FF 1076FF12
76FF1876 FF1A76FF 146A0AC4 830014A5 909A5000 6805FC46 8BFE76FF 1476FF16

FC468BFE 76FF1C76 FF1E76FF 146A0AC4 830014A5 909A5000 7C05FC46 8BFE01FE
909A5000 A405FC46 8BFE76FF 2076FF22 76FF146A 0AC48300 14A5909A 50009005
FF57565E 5F001474 3C9A50F4 468D16E6 76FFFA76 FFE876FF 57560AC4 830014A5
830014A7 029A50F8 46895E5F 0014741C 9A50F446 8D1650EE 468D16F2 76FFE676
5F001472 7C9A50F4 468D16E6 76FF5756 E5468805 8BEA7EC5 EC5689EA 468902C4
FF2ED88B E0D14177 00053D0C 468B5E5F 001472BC 9A50F446 8D16FA76 FF57565E
A7FF2ED8 8BE0D122 7700033D 4898E546 8A942D94 2D945994 2D942D94 599421A7
C998E546 8A02C483 0014A71E 9A171968 0B74010C 7E83944E 944E9448 94599440
FA5689F8 46890255 8B058B0E 7EC5040E 46830000 18C85756 001C1158 00CB5E5F
89EC4689 10568B0E 468B0000 F046C700 00FE46C7 0000FC46 C701A4E9 0375C20B
04EC4683 B275003D 80F87E8B F846FF2D 7500233D 98F34688 98058AF8 7EC5EE56
7E80F046 FFF34688 98058AF8 7EC59C74 C20BFA56 89F84689 02558B05 8BEC7EC5
9634B805 7500F07E 83F846FF FE5689FC 46899630 168B2E96 2E068B2E 23753CF3
FE5689FC 46890012 05963016 8B2E962E 068B2E65 753EF37E 8063EB96 36B868EB
74C20BFA 5689F846 8902558B 058BEC7E C504EC46 83317500 3D80F87E C5F846FF
00F07E83 0EEB963B B813EB96 39B80575 00F07E83 F846FF13 753E3D80 F87EC51B

FFFEF1E9 0375FC46 0BFE468B F65689F4 46895A0E 9640B803 EB963EB8 057501FE
FA76FF48 75C20B0C C4830014 8AD19AF8 76FFFA76 FFF476FF F676FFFC 76FFFE76
61680E04 EB965C68 0E067596 2E063B2E 0D759630 163B2EFE 568BFC46 8BF876FF
A4EC9A01 6A10C483 00145B1C 9A500024 05962E06 8B2E9630 36FF2E96 43680E96
323EF72E 990E462B EC468BEA 5689E846 89040E6E 8310568B 0E468B02 C4830014
C502558B 058BEC7E 8B04EC46 83FE5DE9 0375050B 02458BEC 7EC50529 0A7EC596
61006100 62720072 0004001C 0BBE00CB 5E5FC9D9 EB025589 058904E8 4683E87E
000A2273 25222073 25207463 65726964 65722074 6F6E6E61 63006277 00770062
016DE9FF FFB80674 006005F7 0C7EC50A 768B0000 02C85756 006F7400 6D6F7266
1496649A 206A0C76 FF0E76FF 26740400 05F72C75 09FE834B 75000805 F70C7EC5
FF15750A FE830133 E90009B8 E0750007 05F797EE 3EC52ED1 74FFFF3D 06C48300
0205F74C 75000105 F70C7EC5 A674FFFF 3D06C483 00149664 9A0D6A0C 76FF0E76
9A50FE46 8D165052 D22B0245 8B016A0E 75FF0C7E C5575691 EB00200D 81067500
08558906 45890C55 8B0A458B 0C7EC5D2 EB0C7EC5 057400FE 7E835E5F 001471F6
C502C483 0014A23E 9A008068 26750A45 0B0C458B 0C7EC500 010D8100 800245C7
027D830C 7EC50080 0245C708 55890645 890A458B 9774C20B 0C55890A 45890C7E

5EC4024D FF0C7EC5 FF04E903 74C00B04 C4830014 8CC39A57 0E76FF13 750001FE
7C20FE83 2A740400 05F75175 000805F7 0C7EC505 38C68B06 47FF2606 7FC5260C
3EC52E09 750DFE83 0EEB0DFF 97EE3EC5 2E097508 FE831CEB 05FF97EE 3EC52E09
04C48300 148CC39A 570E76FF 13740400 05F70C7E C51C750A FE830000 05C797EE
F62B0000 0AC85756 001C1162 00CB5E5F C9C68BF0 8BE42AC6 8BFE95E9 0374C00B
09770014 875A9A99 421EDC2E 1246DD1D 75001487 5A9A9942 1EDC2E0A 46DDFF2B
00148874 9A001487 5F9A1246 DD50F846 8D160115 E9EED900 2107C799 4A1EC52E
875A9A99 421EDC2E F846DD32 73001487 5A9A9942 1EDC2E0A 46DDF85E DD0CC483
C1F7C88B 08C48300 1487BF9A 0014875F 9A1246DD 0A5EDDE0 D90A46DD BC750014
01BF125E DDE0D912 46DD0B73 0014875A 9A99421E DC2E1246 DD0001BE 03740001
DD2A7600 14875A9A 994E1EDC 2E1246DD 0F750014 875A9A99 421EDC2E F846DD00
149C169A 0014875F 9A99560E DC2E124E DC08C483 00149D56 9A001487 5F9A0A46
C4830014 87DA9A00 14875F9A 1246DDF8 5EDD995E 06DD2E3F EBF85EDD 08C48300
0A4EDC0A 46DDF85E DDF84EDC 0A46DD09 740001F6 46F71E74 00F67E83 F6468908
F85EDDE0 D9F846DD 0874F60B F85EDDF8 76DCE8D9 0874FF0B DCEBF66E D10A5EDD
0979A371 40D00000 00000000 001C1160 00000000 00000000 CB5E5FC9 9BF846DD

C904C483 0014A626 9A096A00 6AEC8B55 57563FF0 00000000 0000400A 934F01FE
6A026AEC 8B555756 CB5E5FC9 04C48300 14A6269A 0A6A016A EC8B5557 56CB5E5F
5FC904C4 830014A6 269A0A6A 036AEC8B 555756CB 5E5FC904 C4830014 A6269A0C
086A056A EC8B5557 56CB5E5F C904C483 0014A626 9A066A04 6AEC8B55 5756CB5E
5E5FC904 C4830014 A6269A0A 6A066AEC 8B555756 CB5E5FC9 04C48300 14A6269A
9A0A6A08 6AEC8B55 5756CB5E 5FC904C4 830014A6 269A0E6A 076AEC8B 555756CB
CB5E5FC9 04C48300 14A6269A 046A096A EC8B5557 56CB5E5F C904C483 0014A626
269A096A 0B6AEC8B 555756CB 5E5FC904 C4830014 A6269A05 6A0A6AEC 8B555756
56CB5E5F C904C483 0014A626 9A086A0C 6AEC8B55 5756CB5E 5FC904C4 830014A6
A6269A04 6A0E6AEC 8B555756 CB5E5FC9 04C48300 14A6269A 086A0D6A EC8B5557
5756CB5E 5FC904C4 830014A6 269A046A 0F6AEC8B 555756CB 5E5FC904 C4830014
2E0008D0 46C70000 30C85756 00CB5E5F C904C483 0014A626 9A066A10 6AEC8B55
FA5689F8 46890255 8B05030C 468BFE56 89FC4689 02558B05 030A468B 9C123EC5
0312468B F25689F0 46890255 8B050310 468BF656 89F44689 02558B05 030E468B
E646C700 00D646C7 EA5689E8 46890255 8B050318 468BEE56 89EC4689 02558B05
8AF046FF F07EC5DA 46899805 8AE846FF E87EC500 C9E90372 14463BE6 468B0000

E42A058A FE5E8EFC 7E03D67E 8BD44689 98058AF4 46FFF47E C5D84689 980501FE
2A058AFE 5E8EFC7E 0347D67E 8BDE4689 E42A058A FA5E8EF8 7E03D67E 8BE24689
7500DA7E 83D64601 D8468BDC 4689E42A 058AFA5E 8EF87E03 47D67E8B E04689E4
BEC88B16 66F7C703 DE66F7D2 468BF88B DC66F7D4 468BD246 89D4462B 0010B846
FFEC7EC5 E44689C1 03E6F7C7 03E266F7 D2468BF8 8BE066F7 D4468B16 762B0010
001C10C8 CB5E5FC9 FF2CE9E6 46FF0588 E2468BEC 46FFEC7E C509EB08 E8C1EC46
DD2E0022 05C79D0A 3EC52E11 76001487 5A9A9D02 1EDC2E0A 46DD0000 28C85756
0A5EDD0C C4830014 88749A00 14875F9A 0A46DD50 E0468D16 F62B00C0 E99D0E06
0A46DD0A 5EDD0A6E DC9D1606 DD2E0001 BE0E7600 14875A9A 9D161EDC 2E0A46DD
DD0A4EDC 0EC48300 14A48C9A 0014875F 9AE846DD 9D26680E 036AE85E DD0A4EDC
66DCF046 DDF05EDD 0EC48300 14A48C9A 0014875F 9AE846DD 9D3E680E 036AF85E
DDE85EDD E84EDC9D 1E06DD2E 0B74F60B E85EDDD8 76DCF846 DCF046DD D85EDDF8
0AC48300 1488409A 0014875F 9AE846DD 5008C483 001487BF 9A001487 5F9AE046
479E17B8 4357691B 001C1160 405FC000 00000000 00CB5E5F C99BE846 DDE85EDD
403433BA 9313EC1B 4097A7A0 8FEE69B8 3FF6A09E 667F3BCC 3FE00000 00000000
3FF00000 00000000 406D25E5 0F5D12A8 40B11036 2F874CA5 3F97A5C8 556E17B5

002105C7 9E283EC5 2E0E7700 14875A9A 9E201EDC 2E0A46DD 00001AC8 575601FE
14875F9A 0A46DD50 EE468D16 EC740014 875A9A9E 2C1EDC2E 0A46DD00 A2E9EED?
DD9E2C06 DC2E0A46 DD0A5EDD 0A4EDC9E 3406DD2E 0A5EDD0C C4830014 884F9A00
DD9E6C68 0E046AF8 5EDDF04E DCF046DD F05EDDE6 76DC9E2C 26DC2E0A 46DDE65E
0014875F 9AF846DD 9E4C680E 046AE65E DD0EC483 0014A48C 9A001487 5F9AF846
46DC9E44 0EDC2E9E 3C26DC2E EE46DFF8 5EDDF04E DCE676DC 0EC48300 14A48C9A
3FF00000 00000000 001C1160 00000000 00000000 CB5E5FC9 9BF846DD F85EDDF8
C024DBB4 9607A23E 3FD34413 509F79FF 3FE00000 00000000 3FF6A09E 667F3BCC
C0280390 23A5D837 3FC7687A 6A68E1A8 C010BE0C E0CFA002 402AE3A0 30793CC4
9A0D6AEC 8B555756 3FF00000 00000000 C021D27C E3075533 40337B20 999FDC23
5756CB5E 5FC902C4 830F8068 DF9A0C6A EC8B5557 56CB5E5F C902C483 0F8068DF
02C4830F 8068DF9A 0A6AEC8B 555756CB 5E5FC902 C4830F80 68DF9A0B 6AEC8B55
DF9A086A EC8B5557 56CB5E5F C902C483 0F8068DF 9A096AEC 8B555756 CB5E5FC9
555756CB 5E5FC902 C4830F80 68DF9A07 6AEC8B55 5756CB5E 5FC902C4 830F8068
C902C483 0F8068DF 9A056AEC 8B555756 CB5E5FC9 02C4830F 8068DF9A 066AEC8B
68DF9A03 6AEC8B55 5756CB5E 5FC902C4 830F8068 DF9A046A EC8B5557 56CB5E5F

5756CB5E 5FC902C4 830F8068 DF9A026A EC8B5557 56CB5E5F C902C483 0F8001FE
02C4830F 8068DF9A 006AEC8B 555756CB 5E5FC902 C4830F80 68DF9A01 6AEC8B55
8B1E06EC 8B555756 00CB5E5F C902C483 0F8068DF 9A0E6AEC 8B555756 CB5E5FC9
8B071F00 14733C9A 56113236 8D1E500C 468B0014 72BC9A56 1132368D 1E500A46
001473FC 9A561132 368D1E50 0003B8D8 8E001CB8 1E06EC8B 555756CB 5F5E5DE5
32B80489 1126368D 0014745C 9A561132 368D1E34 FF113036 8D561128 368D1E50
1E500000 B8500001 B8500000 B8058926 0A7EC400 14731C9A 56113236 8D1E5000
B81E06EC 8B555756 CB5F5E5D E58B071F 0589260E 7EC40014 735C9A56 1132368D
0000BFF3 E202C783 02C68305 8926028B 0012BE00 06BF104E 8B0A468E D88E001C
0A5E8B11 2636FF05 8926028B 02C78302 C6830589 26028B00 02BF0589 260E468B
24368D1E 112036FF 500001B8 530C5E8B 0014743C 9A561124 368D1E53 0C5E8B53
2EA18436 FF2E006A 57560000 08C85756 00CB5E5F 5DE58B07 1F001474 7C9A5611
057400F8 7E83FE46 895E5F00 14745C9A 50F8468D 1635FFA1 863EC52E A18236FF
50520A76 FF0C76FF 5756FC56 89FA4689 02C48300 14A7029A FE76FF27 EB1038B8
2EA18436 FF2E006A 57560000 08C85756 CB5E5FC9 C02B5E5F 002C0002 9A0E76FF
057400F8 7E83FE46 895E5F00 14745C9A 50F8468D 1635FFA1 863EC52E A18236FF

FF0C76FF 50525756 FC5689FA 468902C4 830014A7 029AFE76 FF27EB10 38B801FE
2EEC8B55 5756001C 1156001C 1150CB5E 5FC9C02B 5E5F002C 00029A0E 76FF0A76
36FF2E44 74C20B0C C4830014 8AD19AA2 28680EA2 2D680EA2 2036FF2E A22236FF
2E2274C2 0B0CC483 00148AD1 9AA22F68 0EA23468 0E500012 05A22006 8B2EA222
75C20B0C C4830014 8AD19AA2 36680EA2 3B680E50 002405A2 20068B2E A22236FF
05A22006 8B2EA222 36FF2EA2 2436FF2E A22636FF 2E02C483 0014A4EC 9A016A0A
3A007200 3A69633A 001C0ED0 001C0BBE 00CB5E5F C908C483 0014A542 9A500024
C70000F8 46C70C75 000A7E83 000008C8 57560000 77003A6F 633A0077 003A6F63
DA7500FC 7E83FE46 895E5F00 1471969A 50FC468D 160A76FF 575629EB 0000FA46
8B000006 C85756CB 5E5FC9FA 568BF846 8BFA5689 F8468902 C4830014 A7029A50
561274FA 460BFC46 8BFC5689 FA468902 C4830014 A23E9A50 FE46890A 6EF70C46
0002C857 56CB5E5F C9FC568B FA468B5E 5F003C00 029AFE76 FF006AFA 76FF5257
76FF1076 FFEC8B55 5756CB5E 5FC95E5F 001471B6 9A50FE46 8D160C76 FF575600
FE8B0A46 01C68B0E 4601C68B 00FFBE03 7E00FFFE 81F08B04 C4830014 A6949A0E
0A5EC5C6 8BE5E507 880A4EFF 0A5EC5E4 2A078A0E 5EC50E4E FF1474C0 0B4FC78B
7EC5FE56 89FC4689 0C568B0A 468B0000 04C85756 CB5E5FC9 0C568B0A 468B0788

0A7EC5E4 2A058A0E 46FF0E7E C51474C0 0B4EC68B F08BE42A 058A0E46 FF0E01FE
57560000 02C85756 00CB5E5F C9FE568B FC468B00 05C60A7E C5E5EB05 880A46FF
2EE42A05 8AA4123E C52E5E5F 001474BC 9A50FE46 8D16A40A 36FF2EA4 0C36FF2E
9A50FE46 8D16A40A 36FF2EA4 0C36FF2E 57560005 C6A4123E C52E0588 A40E3EC5
0588A412 3EC52EE4 2A058AA4 0E3EC52E 000002C8 5756CB5E 5FC95E5F 001474DC
001C1142 CB5E5FC9 5E5F0014 74DC9A50 FE468D16 A40A36FF 2EA40C36 FF2E5756
731C9A50 F4468D16 F676FF57 560008F6 46C70000 0CC85756 001C1146 001C1140
14745C9A 50F4468D 16FF6AA4 8836FF2E A48A36FF 2E006A57 56FE4689 5E5F0014
5600FE02 45C7F87E C5FA5689 F8468902 C4830014 A7029AFE 76FFFC46 895E5F00
5756001C 114800CB 5E5FC95E 5F001474 3C9A50F4 468D1600 6AFE76FF FC76FF57
C1DF8B22 7EF73B00 01BF4EF0 5EDD0A46 DDF85EDD 07DD125E C516768B 000010C8
8BDAEB47 F05EDDF0 4EDC0A46 DDF85EDD F846DC0F DCF046DD 145E8E12 5E0303E3
575600CB 5E5FC99B F846DDF8 5EDDF846 DC0FDCF0 46DD145E 8E125E03 03E3C1DF
6805A540 168B2EA5 3E068B2E FE5689FC 4689A540 168B2EA5 3E068B2E 000004C8
D4EB12FC 468304C4 8300148D 2A9A57FE 76FF0C74 003D83FC 7EC51A76 FC463B01
0B0C458B 0A7EC5EC 8B555756 001C0BBE CB5E5FC9 5E5F0014 70B69A0A 76FF5756

```
05F70010 0D810C55 890A4589 10568B0E 468B3174 0E460B10 468B3975 0A4501FE
C9000002 45C70A7E C508EB00 800245C7 08558906 45891056 8B0E468B 13740001
7EC54E16 74F60BFE 5689FC46 890C568B 0A468B12 768B0000 04C85756 00CB5E5F
FC46FFFC 7EC50B74 C00B4EC6 8BE[illegible]75C0 0A0588FC 46FFFC7E C598058A 0E46FF0E
5F9A0A46 DD50F846 8D160000 08C85756 00CB5E5F C90C568B 0A468BEE EB0005C6
DDF846DC A61E06DD 2E0B7400 14875A9A A6161EDC 2E0CC483 00148874 9A001487
06EC8B55 57563FF0 00000000 00000000 00000000 0000CB5E 5FC99BF8 46DDF85E
0A7E030A 7E03FE8B 071616C6 83F58B1F 1604C483 0F9068DF 9A0C76FF 0A76FF1E
8B0A468B 000004C8 5756CB5E 5FEB035D 071FE303 FCA5F3FD 000EB9E3 D10A5E8B
0A468BEB 75C00A05 88FC46FF FC7EC598 058A0E46 FF0E7EC5 FE5689FC 46890C56
0A46FF0A 7EC5FE56 89FC4689 0C568B0A 468B0000 04C85756 00CB5E5F C90C568B
5F9A0A46 DD50F846 8D160000 08C85756 CB5E5FC9 48FC462B 0A468BF5 75003D80
76FF5756 000002C8 575600CB 5E5FC99B F846DDD8 DD0CC483 00148874 9A001487
890A468B 000004C8 575600CB 5E5FC95E 5F001475 3C9A50FE 468D1600 6A006A0A
830014A6 E29A0A76 FFEC8B55 575600CB 5E5FC9FE 568BFC46 8B0000FC 46C7FE46
00000000 00000000 00000000 00000000 00CB5E5F C9EC8B55 5756CB5E 5FC902C4

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
6F650065 6E69626D 6F630000 00000000 00000000 00000000 00000000 00000000
00000000 00000000 00000000 00000000 00000000 00000001 00007065 6E69626D
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
49524554 3A004864 253B6425 5B1B0048 64253B64 255B1B00 4A325B1B 00000000
5D1B000A 6C656E6E 61686320 7475706E 69206E65 706F2074 6F6E6E61 430A003A
6F6E6E61 430A0077 003A6F72 65743A00 0D5C1B31 3D542C30 3D4F2C31 3D453A43
6120746F 6E6E6143 0A000A6C 656E6E61 68632074 75707475 6F206E65 706F2074
006D305B 1B006D37 5B1B000A 786F626C 69616D20 6B736174 20657461 636F6C6C
71717171 71717171 6C30281B 00006D30 5B1B0020 20202020 20202000 6D375B1B
281B006B 71717171 71717171 71717171 71717171 71717171 71717171 71717171
20202020 20202020 20202020 20202020 20202020 20207848 30323B64 255B1B30
71717171 74483032 3B31315B 1B30281B 00782020 20202020 20202020 20202020
71717171 71717171 71717171 71717171 71717171 71717171 71717171 71717171
20202020 20202020 20202020 20202020 20207848 30323B64 255B1B30 281B0075
```

```
30323B64 255B1B30 281B0078 20202020 20202020 20202020 20202020 202001FE
20202020 20202020 20202020 20202020 20202020 20202020 20202020 20207848
373B315B 1B202020 20202020 78483032 3B34315B 1B30281B 00782020 20202020
20202020 2020206D 305B1B61 61616161 61616161 61616161 61616161 6161616D
20202020 20202020 6A712030 20202020 78483032 3B35315B 1B30281B 00782020
323B3631 5B1B3028 1B007820 20202525 30303120 716D2020 20202020 20202020
71717171 71717171 71717171 71717171 71717171 71717171 71717171 716D4830
41200068 30325B1B 006D375B 1B004831 3B315B1B 0042281B 6A717171 71717171
20293266 28202000 20207469 75512020 00202029 31662820 20002020 74726F62
6261006D 305B1B73 256D375B 1B483832 3B34315B 1B007325 203A454C 49460020
45545359 530A0046 4E495F54 41545308 00000001 00000000 00000000 7374726F
00000000 00000000 00000000 00000008 08080808 000E160C 02010046 4E495F4D
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000AC2
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00200000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
65706F20 746F6E6E 61430A00 77003A6F 7265743A 00000000 00000000 00000000
38323B34 315B1B00 7374726F 6261000A 6C656E6E 61686320 74757074 756F206E
54415453 5F544154 530B0046 4E495F54 41545308 006D305B 1B73256D 375B1B48
00000000 00000000 00000000 00000000 00464E49 5F4D4554 5359530A 00005355
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
6F697372 65765F6D 6172676F 72700000 00000000 00000000 00000000 00000000
6D75736B 63656863 2C2A2A2A 2A2A2A2A 2A2A2A2A 2A2A2A3D 7265626D 756E5F6E
20200000 53533A4D 4D3A4848 00000059 592F4444 2F4D4D3D 65746164 202C2A3D
00656572 66700063 6F6C6C61 63700FCC 00002020 20202020 20202020 20202020
0000646E 65707375 735F656C 62616E65 00646E65 70737573 5F656C62 61736964
004D4553 5F4D5245 54080046 4E495F4D 45545359 530A004A 4C414943 45505308
00000000 00000000 00000000 00000000 00000000 00000000 FFFE0000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
4D415241 500A0000 FFFF7862 6D69646E 77070000 00000000 FFFF0000 00000000

FFFF4B43 41545305 58424D50 53455207 00000000 00000000 00535245 544501FE
00000000 00000000 00000000 00000000 00000000 00000000 000A0001 43584503
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
1E084E8B 0E7EC406 0A76C4EC 8B550000 1E8E2E1E 00000000 00000000 00000000
0C4E8B0E 7EC40612 76C4EC8B 5500001E 8E2E1E00 0ACA1F5D 591FA4F2 FCFE5E8E
0000000E CA1F5D59 1FF7E2AA 1FD7DA8E 1EAC09E3 FCFE5E8E 1E07C28C 085EC406
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
0E7EC406 0A76C4EC 8B550000 1E8E2E1E 00000000 00000000 00000000 00000000
00000000 00000000 00000000 00000000 0ACA1F5D 591FA5F2 FCFE5E8E 1E084E8B
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
```

```
00000000 00000000 00000000 00000000 00000000 00000000 00000000 000001FE
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
00000000 00000000 00000000 00000000 00000000 00000000 00000000 00000000
0A468AEC 8B550000 1E8E2E1E 00000000 00000000 00000000 00000000 00000000
02008690 00000000 00000000 0024D02E 00000008 CA1F5DAA F2FC084E 8B0C7EC4
33940A4C 00030000 001C0024 0014001C 00000000 D02ED02E 00000000 00000000
2B132AE9 2ACF2ABB 2AA72A89 2A722A6A 33B433B0 33AC33A8 33A433A0 339C3398
2CE22CC4 2CA12C77 2C492C34 2C242C0A 2BEA2BCC 2BA92B94 2B7B2B6C 2B4F2B32
2E0A33CC 33C833C4 33C033BC 33B82DBB 2DA82D78 2D682D5C 2D3D2D29 2D072CF2
302B3026 30142FC1 2FAC2F93 2F842F5C 2F472F2E 2F1F2EA7 2E802E66 2E3E2E1E
31E331CD 31C831B6 3181316C 31533144 311E3119 30A13097 308C3081 3078305A
332D3328 331A3302 32D432AE 32A932A0 3295328C 3262325D 324E3243 323431E8
29D029CC 182817CA 29C829C4 29C029BC 3388337B 33643357 3347333C 33373332
```

| | | | | | | | |
|---|---|---|---|---|---|---|---|
| 2A0E2A0A | 2A062A02 | 29FE29FA | 29F629F2 | 29EE29EA | 29E629E2 | 29DE29DA | 29D601FE |
| 190018D1 | 18BB18A6 | 18912A3A | 2A362A32 | 2A2E2A2A | 2A262A22 | 2A1E2A1A | 2A162A12 |
| 1CF81CDF | 1AFD1AF8 | 1AF01AEB | 1AB51AB0 | 1AA81AA3 | 1A901A8B | 1A831A7E | 19591928 |
| 202A2022 | 201D1E8E | 1E891E81 | 1E7C1D90 | 1D7E1D79 | 1D611D49 | 1D441D30 | 1D151D10 |
| 240523FD | 23F823CA | 230222F0 | 22D522B4 | 227E226C | 22592247 | 220A2192 | 2096202F |
| 4CB04CAC | 4CA84CA4 | 4CA04C9C | 4C984C94 | 4C904C8C | 4C884C84 | 260B2590 | 2494240A |
| 460545D0 | 4CF84CF4 | 4CE04CDC | 4CD84CD4 | 4CD04CCC | 4CC84CC4 | 4CC04CBC | 4CB84CB4 |
| 49F749F2 | 4D004CFC | 4991490D | 48FB4891 | 4862485D | 48294805 | 47E747E2 | 47D047B3 |
| 54389C14 | 4C5D4C33 | 4B994B72 | 4B514B38 | 4B174A49 | 4A444A3C | 4A374A19 | 4A0449FF |
| 5480547C | 54785474 | 5470546C | 54685464 | 5460545C | 54585454 | 5450544C | 5440543C |
| 4F5E4EA8 | 4EA34E9B | 4E964E63 | 4E5E4E56 | 4E514D98 | 4D754D55 | 4D3E548C | 54885484 |
| 523D522B | 520351A7 | 513A511D | 511250F5 | 50434FB5 | 4FB04FA8 | 4FA34F70 | 4F6B4F63 |
| 79C479C0 | 79BC79B8 | 79B479B0 | 79AC79A6 | 54175341 | 549C5498 | 54945490 | 5266524F |
| 76077602 | 75E775E2 | 75D975C6 | 75C175B5 | 758279E8 | 79E479E0 | 79DC79D0 | 79CC79C8 |
| 79777932 | 78F678C3 | 784C79EC | 77FF77BE | 77927777 | 774D7727 | 76E976E4 | 76C476BF |
| 827C8278 | 82747F86 | 7F647F0F | 7ED57ED0 | 7EAE7EA9 | 8270826C | 82668262 | 799A7988 |
| 87168713 | 86AF824E | 819D8161 | 812580A6 | 8076828C | 8288802F | 7FDE8284 | 828001FE |
| 3490347A | 345A3414 | 340A33F1 | 3C863C82 | 3C7E3C7A | 86ED885A | 874E8744 | 873B8726 |
| 360F35EC | 35E535C9 | 35C13598 | 356E3558 | 3537351C | 3C8A34F3 | 34E334CE | 34B83497 |
| 3CBE3CBA | 3CB63CB2 | 3CAE3CAA | 3CA63CA2 | 3C9E3C9A | 3C963C92 | 3C8E3669 | 364B3633 |
| 390438E3 | 38983878 | 38473831 | 380937EF | 378E3778 | 37573706 | 36E536D2 | 36A43CC2 |
| 3B1A3AE5 | 3AC63A48 | 3A433A07 | 39FC39CF | 3CDA3CD6 | 3CD23CC6 | 39823967 | 39453917 |
| 14361432 | 3C6F3C5E | 3C4C3C28 | 3C0B3BF5 | 3BD73BBD | 3B9F3B98 | 3B803B5F | 3B493B2C |
| 145A1456 | 145200DF | 00CD00A9 | 00760064 | 144E144A | 14461442 | 143E143A | 002E001C |
| 020001D4 | 01C30195 | 017A0159 | 013F0114 | 01001476 | 1472146E | 146A1466 | 1462145E |
| 14961492 | 148E148A | 14861482 | 147E031E | 02FF02DC | 02AA0281 | 147A024A | 02350220 |
| 14A20575 | 054E0510 | 04DC04BC | 04A10463 | 043B042D | 03EF03BB | 03A8036A | 149E1[illegible]A |
| 07470738 | 0728070A | 06EC06CF | 06AF06A4 | 068B061E | 05D7059B | 14B614AE | 14AA14A6 |
| 090D08F1 | 08E814D6 | 14D214CE | 14CA14C6 | 14C214BE | 14BA08CD | 080907D4 | 079F075A |
| 0A730A67 | 0A550A39 | 0A270A0B | 09F909DD | 09CB09AD | 099B097D | 096B094F | 093D091F |
| 0C550C06 | 0BA90B2E | 0AEE0AD2 | 0AB414FA | 14F614F2 | 14EE14EA | 14E614E2 | 14DE14DA |
| 0F8A0F74 | 0F490F17 | 14FE0ECC | 0EC40EAC | 0E9B0E5D | 0E1F0DD8 | 0D880D3D | 0CF60CAB |
| 10180FFD | 0FF5152A | 1526151A | 15161512 | 150E150A | 15061502 | 0FC40FAA | 0FA001FE |
| 11D011BA | 11941182 | 116B115D | 112A110D | 10E910D7 | 10AA1098 | 10701055 | 10481040 |
| 152E139A | 138C137A | 13681336 | 131B12D0 | 12881283 | 1259124D | 123B1224 | 121611E3 |
| 3D7E3D6B | 3D583D45 | 3D323D1F | 3D0C3CF9 | 3CE61429 | 141B1410 | 13F313D8 | 13AD1532 |
| 3EAE3E9B | 3E883E75 | 3E623E4F | 3E3C3E29 | 3E163E03 | 3DF03DDD | 3DCA3DB7 | 3DA43D91 |
| 3FDE3FCB | 3FB83FA5 | 3F923F7F | 3F6C3F59 | 3F463F33 | 3F203F0D | 3EFA3EE7 | 3ED43EC1 |
| 410E40FB | 40E840D5 | 40C240AF | 409C4089 | 40764063 | 4050403D | 402A4017 | 40043FF1 |
| 423E422B | 42184205 | 41F241DF | 41CC41B9 | 41A64193 | 4180416D | 415A4147 | 41344121 |
| 436E435B | 43484335 | 4322430F | 42FC42E9 | 42D642C3 | 42B0429D | 428A4277 | 42644251 |
| 449E448B | 44784465 | 4452443F | 442C4419 | 440643F3 | 43E043CD | 43BA43A7 | 43944381 |
| 558F5569 | 55555ACE | 552D5519 | 5ACA54F1 | 54DD5AC6 | 54B55AC2 | 44EA44D7 | 44C444B1 |
| 5774574E | 572E571A | 5ADA56E9 | 56D55AD6 | 56A4567B | 56555641 | 5AD25613 | 55E155AF |
| 59445930 | 5AEA58FC | 58E85AE6 | 58B458A0 | 5AE2586C | 58585ADE | 582457FB | 57CF57A3 |
| 82D182BE | 82AB8298 | 5AB75AF6 | 5A6F5A49 | 5A235A0F | 5AF259DE | 59CA5AEE | 5999596A |
| 840183EE | 83DB83C8 | 83B583A2 | 838F837C | 83698356 | 83438330 | 831D830A | 82F782E4 |
| 8531851E | 850B84F8 | 84E584D2 | 84BF84AC | 84998486 | 84738460 | 844D843A | 84278414 |
| 864E863B | 86288615 | 860285EF | 85DC85C9 | 85B685A3 | 8590857D | 856A8557 | 854401FE |
| 9F7A9F67 | 9F549F41 | 9F2E9F1B | 9F089EF5 | 9EE29ECF | 9EBC9EA9 | 9E968687 | 86748661 |
| 9A839A6E | 9A599A44 | 9A2F9A1A | 9A0599F0 | 99DB99C6 | 99B1999C | 99879972 | 9FA09F8D |
| 7AC97AB6 | 7AA37A90 | 7A7D7A6A | 7A577A44 | 7A317A1E | 7A0B79F8 | A6369AC2 | 9AAD9A98 |
| 7BF97BE6 | 7BD37BC0 | 7BAD7B9A | 7B877B74 | 7B617B4E | 7B3B7B28 | 7B157B02 | 7AEF7ADC |
| 7D297D16 | 7D037CF0 | 7CDD7CCA | 7CB77CA4 | 7C917C7E | 7C6B7C58 | 7C457C32 | 7C1F7C0C |
| 7E597E46 | 7E337E20 | 7E0D7DFA | 7DE77DD4 | 7DC17DAE | 7D9B7D88 | 7D757D62 | 7D4F7D3C |
| A0A0A052 | A03AA01D | A0089FF0 | 9FDF9FCD | 9FBEA729 | A2DEA2BD | A29CA274 | A2637E6C |
| A402A3D0 | A3A0A414 | A410A40C | 91A2915A | 914F9131 | 90A7905F | 90549036 | 924EA0B7 |
| 68636BD0 | 68146BCC | 67D167C0 | 6796676A | 6759672F | 66F166E0 | 66BC6BC8 | 668D666E |
| 69DC69D2 | 69B96BE0 | 6971695E | 69466916 | 690168E7 | 68CF6BDC | 68B46BD8 | 688D6BD4 |
| 6B996B70 | 6B586BEC | 6BE86B22 | 6AD76ABA | 6AA26A8E | 6A616A45 | 6BE46A17 | 6A076A00 |
| 94648F6D | 8F468F38 | 8F268F10 | 8F018EE7 | 8E9E8E8A | 8E7C8E3F | 8E318E16 | 8E086BBD |
| 940C93FB | 93DB93D0 | 93B7939F | 9385936B | 93519331 | 931692D6 | 92CB92AA | 92969278 |
| 630462EB | 62C4626D | 624D623A | 62206203 | 61E261C1 | 6179615A | 61496130 | 61099454 |
| 65386519 | 650864EE | 64C76478 | 6460642B | 640B63F8 | 63DE63C1 | 63A0637F | 63346315 |

A188A184 A47FA45A A44DA42E A48A564A 662A6617 65FD65E0 65BF659E 658D01FE
6BFA704E 70467032 702A7022 701E701A 7016A6F9 A178A15D A145A118 A0FDA0E5
6F036EFE 6EDC6EC6 6EBA6EB5 6EA36E9E 6E4F6E39 6D986D8A 6D196C6C 6C646BFF
8BA38B7F 8B60834E 8AE68AC8 8DE2A536 A523A540 A5FFA5F2 A5ED6F97 6F926F76
98339816 9807994C A6D2A6CD 8D828D64 8D508D39 8CFA8CB7 8C9B8C5B 8C3C8BD0
95909630 98F698F1 98D998D4 98C498BF 98B598A6 988C9871 986C985A 984B9838
5DF05D8E 5BC25B6D 5B2F5B13 60ACA216 A1F6A1E8 A1C6A1A4 A226A222 95DC95D2
9DD99D98 9D939D84 9D679E2A A2F46052 60355F89 5F605F27 5EDC5E4B 5E425E0A
9CF19CEC 9CE09CDB 9CA99CA4 9C8D9C88 9C619C4E 9C499C27 9D0C9DF7 9DF29DDE
71D171B1 71917171 71517131 711170F1 70D197D5 97669736 96FE96C6 969B97F0
741773F7 73D773B7 73977377 73577337 731772F7 72D772B7 72977229 721171F1
453F0A00 033F5444 4C040002 75577537 751774F7 74D774B7 74977477 74577437
0E00064B 43415453 05000520 2020312E 47455344 3F0A0004 20202031 2E474553
00084544 4F435F44 524F5745 564F4D0D 00074544 4F435F53 45545942 45564F4D
00000000 00000000 00000000 00000018 00064544 4F435F53 45545942 5445530D
00A80000 007E0000 00570000 002D0000 00040088 00010000 00000000 00000000

000001CE 000001A5 0000017C 00000154 00000126 000000FB 000000D0 000001FE
0000031D 000002F5 000002CB 0000029E 00000275 00000249 00000220 000001F9
0000045B 00000434 00000409 000003E3 000003BA 00000395 0000036E 00000345
00000003 06BC0003 00000552 00000529 00000500 000004D6 000004AC 00000485
00000434 00000233 000001F7 000000D8 00000049 0000003B 00000027 00000010
0000091A 00000905 000007B5 00000687 000005FD 0000053C 000004E6 0000043F
00000F1F 00000EC8 00000EA8 00000DB0 00000BB4 00000BA6 00000B40 000009F9
000014F9 000014C2 0000149E 00001311 00001189 0000117A 00000FEA 00000FDE
0000184F 0000183D 00001818 000017B6 00001770 0000164C 0000157E 0000156F
00001AE4 00001A9F 00001A76 00001A3D 000019C5 0000197A 00001939 00001897
00001E32 00001DD2 00001D9A 00001CBC 00001C51 00001C07 00001B32 00001B25
000020D3 000020A2 0000206A 00002047 0000201C 00001FDC 00001FCA 00001E3F
0000237E 0000236F 0000233B 00002296 00002270 000021CC 000021B1 00002119
0000243E 00002424 0000240E 000023F3 000023DC 000023C0 000023A8 00002391
000024E0 000024CA 000024B2 0000249F 0000248D 00002476 00002463 00002450
00002594 00002578 00002562 0000254C 00002538 00002523 00002508 000024F4

265D0000 26460000 262A0000 260E0000 25F50000 25DF0000 25C30000 25AA01FE
27270000 270E0000 26F40000 26D90000 26C00000 26AA0000 26910000 26770000
28010000 27E80000 27CE0000 27B30000 27970000 277A0000 275C0000 27430000
28C40000 28A70000 288C0000 28740000 285E0000 28460000 28300000 281A0000
29840000 296E0000 29590000 29430000 292E0000 29130000 28FA0000 28DE0000
2A310000 2A1B0000 2A040000 29EC0000 29D90000 29C60000 29AF0000 299B0000
2AE00000 2AC50000 2AA90000 2A920000 2A7B0000 2A680000 2A560000 2A430000
2BA90000 2B920000 2B770000 2B5E0000 2B440000 2B2A0000 2B120000 2AFA0000
2C710000 2C5E0000 2C400000 2C250000 2C0D0000 2BF20000 2BDB0000 2BC00000
2D2B0000 2D130000 2CF60000 2CE10000 2CC70000 2CB30000 2CA00000 2C890000
2DE00000 2DCB0000 2DB70000 2DAC0000 2D950000 2D720000 2D5E0000 2D400000
2F4E0000 2F1E0000 2ECB0000 2E7A0000 2E650000 2E450000 2E260000 2E050000
30E00000 30AB0000 306E0000 30490000 30330000 2FF70000 2FA70000 2F720000
32A30000 32690000 32420000 32010000 31BB0000 317C0000 313E0000 31110000
33DB0000 33C00000 33B30000 337B0000 33690000 333E0000 331A0000 32DF0000
34AB0000 34950000 34780000 345B0000 34430000 342B0000 34120000 33F60000

00003553 00003537 0000351C 00003501 000034ED 000034D9 000034C2 000001FE
0000361B 000035FF 000035E8 000035D0 000035B7 0000359F 00003589 0000356E
000036EC 000036D0 000036B4 0000369C 00003683 0000366A 00003650 00003637
000037B8 000037A0 00003784 00003769 00003751 00003736 0000371D 00003704
0000387F 00003866 00003848 00003830 00003818 00003801 000037EA 000037CE
00003955 00003939 00003929 0000390F 000038F2 000038D5 000038B9 0000389D
00003A1E 00003A06 000039EB 000039CE 000039B4 0000399C 00003984 0000396E
00003AED 00003AD5 00003AC8 00003AAC 00003A8C 00003A6C 00003A52 00003A38
00003BB9 00003BA0 00003B87 00003B6B 00003B54 00003B3C 00003B23 00003B0A
00003C91 00003C75 00003C58 00003C3A 00003C1C 00003BFF 00003BE3 00003BD0
00003D31 00003D19 00003CFE 00003CE9 00003CD2 00003CBB 00003CAD 00003C96
00003DF5 00003DD8 00003DC4 00003DAE 00003D96 00003D7F 00003D64 00003D47
00003EBE 00003EA1 00003E8B 00003E70 00003E59 00003E41 00003E2C 00003E11
00003F84 00003F69 00003F52 00003F3B 00003F23 00003F0C 00003EF3 00003EDA
00004036 00004021 0000400A 00003FF3 00003FDD 00003FCB 00003FB5 00003F9F
000040F7 000040E2 000040C6 000040B1 00004090 00004079 00004065 00004051

| | | | | | | | |
|---|---|---|---|---|---|---|---|
| 41B80000 | 419E0000 | 41880000 | 41710000 | 41580000 | 41420000 | 41250000 | 411001FE |
| 427B0000 | 42610000 | 42470000 | 42280000 | 420C0000 | 41F50000 | 41E50000 | 41CD0000 |
| 43AB0000 | 43A60000 | 434D0000 | 43320000 | 43260000 | 43010000 | 42C50000 | 42870000 |
| 44D70000 | 44CE0000 | 44720000 | 44170000 | 44020000 | 43F70000 | 43E40000 | 43C30000 |
| 45B30000 | 459C0000 | 457D0000 | 45630000 | 454B0000 | 453E0000 | 451F0000 | 45000000 |
| 47B00000 | 47450000 | 472B0000 | 47100000 | 46DC0000 | 469D0000 | 464A0000 | 45FE0000 |
| 499E0000 | 49940000 | 496D0000 | 493F0000 | 491B0000 | 487A0000 | 482F0000 | 48090000 |
| 4C440000 | 4C160000 | 4B1F0000 | 4B140000 | 4A5E0000 | 4A180000 | 49EB0000 | 49C50000 |
| 50E60000 | 501C0000 | 50050000 | 4FFA0000 | 4ED10000 | 4E740000 | 4D580000 | 4C520000 |
| 00050000 | 51F40000 | 51E90000 | 51B60000 | 51A90000 | 515F0000 | 51160000 | 50F30000 |
| 00770000 | 006B0000 | 005F0000 | 004F0000 | 003E0000 | 002B0000 | 00170000 | 000207AC |
| 01240000 | 01070000 | 00F60000 | 00DE0000 | 00C20000 | 00A80000 | 00970000 | 00830000 |
| 01E00000 | 01D10000 | 01B80000 | 01A60000 | 018F0000 | 01760000 | 01570000 | 013B0000 |
| 02750000 | 02610000 | 024C0000 | 02380000 | 02240000 | 02100000 | 01FF0000 | 01EE0000 |
| 03120000 | 03020000 | 02ED0000 | 02E00000 | 02D30000 | 02BD0000 | 02A50000 | 028D0000 |
| 03A00000 | 03900000 | 037D0000 | 036C0000 | 035C0000 | 034A0000 | 033A0000 | 03250000 |

| | | | | | | | |
|---|---|---|---|---|---|---|---|
| 0000042C | 00000417 | 000003FF | 000003EC | 000003D5 | 000003C4 | 000003B3 | 000001FE |
| 000004BD | 000004AB | 00000496 | 00000486 | 00000477 | 0000045E | 00000450 | 0000043B |
| 00000557 | 00000540 | 0000052E | 0000051B | 00000508 | 000004F3 | 000004DF | 000004CF |
| 000005FA | 000005E4 | 000005D0 | 000005BD | 000005AB | 00000595 | 00000584 | 0000056C |
| 0000069F | 0000068D | 00000675 | 0000065E | 0000064B | 00000638 | 00000624 | 00000610 |
| 00000738 | 00000720 | 0000070B | 000006F7 | 000006E7 | 000006D8 | 000006C1 | 000006B1 |
| 000007D6 | 000007C3 | 000007B1 | 0000079A | 00000783 | 00000770 | 00000761 | 00000751 |
| 00000865 | 00000852 | 00000839 | 00000827 | 00000818 | 00000809 | 000007FB | 000007EB |
| 0000090F | 000008F9 | 000008E7 | 000008CD | 000008BC | 0000089D | 0000088A | 00000878 |
| 000009B1 | 0000099C | 00000988 | 00000972 | 00000964 | 0000094A | 0000093B | 00000925 |
| 00000A55 | 00000A41 | 00000A2A | 00000A18 | 00000A00 | 000009EF | 000009D8 | 000009C9 |
| 00000AF6 | 00000ADF | 00000AD0 | 00000ABD | 00000AA6 | 00000A95 | 00000A7D | 00000A6B |
| 00000B98 | 00000B89 | 00000B6F | 00000B61 | 00000B49 | 00000B35 | 00000B20 | 00000B0A |
| 00000C40 | 00000C29 | 00000C16 | 00000BFF | 00000BED | 00000BD7 | 00000BBF | 00000BAA |
| 00000CD7 | 00000CC4 | 00000CB6 | 00000CA1 | 00000C8C | 00000C77 | 00000C65 | 00000C54 |
| 00000D75 | 00000D60 | 00000D4E | 00000D3E | 00000D28 | 00000D16 | 00000D05 | 00000CF2 |

| | | | | | | | |
|---|---|---|---|---|---|---|---|
| 0E030000 | 0DF20000 | 0DE30000 | 0DCC0000 | 0DBC0000 | 0DA60000 | 0D960000 | 0D8701FE |
| 0E8A0000 | 0E7C0000 | 0E6B0000 | 0E5A0000 | 0E490000 | 0E3A0000 | 0E250000 | 0E140000 |
| 0F310000 | 0F1E0000 | 0F070000 | 0EF20000 | 0EDD0000 | 0ECB0000 | 0EB80000 | 0EA10000 |
| 0FE10000 | 0FC80000 | 0FB50000 | 0F9D0000 | 0F880000 | 0F740000 | 0F5D0000 | 0F490000 |
| 10820000 | 106E0000 | 10590000 | 10460000 | 10360000 | 10220000 | 100E0000 | 0FFA0000 |
| 11370000 | 111F0000 | 11070000 | 10F00000 | 10DD0000 | 10C30000 | 10AE0000 | 10990000 |
| 11E70000 | 11D10000 | 11B80000 | 11A10000 | 118F0000 | 11770000 | 11630000 | 114B0000 |
| 12920000 | 127A0000 | 12680000 | 12540000 | 123F0000 | 122B0000 | 12140000 | 11FF0000 |
| 13480000 | 13380000 | 13200000 | 13060000 | 12F10000 | 12D90000 | 12C20000 | 12AB0000 |
| 13F60000 | 13DF0000 | 13CD0000 | 13B90000 | 13A50000 | 13890000 | 13740000 | 135E0000 |
| 14AF0000 | 149A0000 | 14810000 | 146B0000 | 144F0000 | 143B0000 | 14240000 | 140E0000 |
| 15640000 | 15510000 | 15370000 | 15220000 | 15090000 | 14F00000 | 14DC0000 | 14C80000 |
| 16110000 | 16020000 | 15E80000 | 15D00000 | 15B80000 | 15A50000 | 15900000 | 15790000 |
| 16BE0000 | 16AA0000 | 16980000 | 16800000 | 166C0000 | 16570000 | 16410000 | 16240000 |
| 17540000 | 17420000 | 172D0000 | 171C0000 | 17060000 | 16F40000 | 16E30000 | 16CF0000 |
| 17ED0000 | 17D40000 | 17C40000 | 17B20000 | 179D0000 | 17910000 | 177E0000 | 176B0000 |

| | | | | | | | |
|---|---|---|---|---|---|---|---|
| 0000186B | 00001858 | 00001847 | 00001839 | 00001827 | 00001817 | 000017FF | 000001FE |
| 0000190D | 000018FA | 000018E5 | 000018D2 | 000018C2 | 000018B0 | 00001899 | 0000187E |
| 000019B0 | 0000199C | 00001989 | 00001972 | 00001961 | 0000194F | 00001937 | 00001920 |
| 00001A5B | 00001A42 | 00001A29 | 00001A18 | 00001A07 | 000019EE | 000019D6 | 000019C3 |
| 00001AFB | 00001AEF | 00001ADA | 00001AC3 | 00001AB0 | 00001A9D | 00001A86 | 00001A6F |
| 00001B7A | 00001B6A | 00001B5A | 00001B4B | 00001B37 | 00001B25 | 00001B17 | 00001B09 |
| 00001C0E | 00001BFD | 00001BE7 | 00001BCF | 00001BBF | 00001BB1 | 00001B9F | 00001B90 |
| 00001C9E | 00001C88 | 00001C71 | 00001C65 | 00001C56 | 00001C41 | 00001C2F | 00001C22 |
| 00001D4B | 00001D33 | 00001D1E | 00001D07 | 00001CEE | 00001CD8 | 00001CCB | 00001CB2 |
| 00001DC4 | 00001DB7 | 00001DA8 | 00001D98 | 00001D88 | 00001D78 | 00001D66 | 00001D59 |
| 00001E3F | 00001E31 | 00001E24 | 00001E17 | 00001DFF | 00001DEF | 00001DDF | 00001DD2 |
| 00001EA6 | 00001E99 | 00001E8C | 00001E7F | 00001E73 | 00001E66 | 00001E59 | 00001E4C |
| 00001F0E | 00001F01 | 00001EF4 | 00001EE7 | 00001EDA | 00001ECD | 00001EC0 | 00001EB3 |
| 00001F73 | 00001F65 | 00001F59 | 00001F4D | 00001F40 | 00001F34 | 00001F27 | 00001F1B |
| 00001FDC | 00001FCF | 00001FC2 | 00001FB5 | 00001FA7 | 00001F9C | 00001F8D | 00001F80 |
| 00002048 | 0000203A | 0000202C | 0000201D | 0000200E | 00002003 | 00001FF6 | 00001FE9 |

20B80000 20AA0000 209D0000 208E0000 20820000 20740000 20650000 205701FE
21200000 21130000 21060000 20F90000 20EC0000 20DF0000 20D20000 20C50000
21880000 217B0000 216E0000 21610000 21540000 21460000 213A0000 212D0000
22030000 21F30000 21E40000 21D40000 21C60000 21B70000 21A20000 21940000
22900000 22790000 22690000 22500000 22410000 22330000 22230000 22150000
23460000 232F0000 23160000 22FD0000 22E60000 22D20000 22BE0000 22A70000
23F70000 23E10000 23CB0000 23B60000 239E0000 23870000 23720000 23590000
00140000 00000664 00060000 245F0000 244F0000 24400000 24230000 24060000
00960000 00860000 006C0000 005A0000 004E0000 00400000 00360000 00230000
01230000 01120000 01000000 00EA0000 00DC0000 00CF0000 00B20000 00A50000
01900000 017D0000 01720000 01670000 01590000 01460000 01390000 012E0000
01FF0000 01F40000 01E80000 01DD0000 01CB0000 01BD0000 01B30000 01A60000
02800000 02760000 02610000 024C0000 023D0000 02270000 021A0000 020B0000
02DE0000 02D30000 02C00000 02B50000 02AB0000 02A00000 02960000 028B0000
03360000 032B0000 03200000 03160000 030A0000 03000000 02F40000 02E90000
03AD0000 03920000 03870000 037C0000 03720000 03670000 03580000 03410000

00000418 00000406 000003F1 000003DF 000003D3 000003C9 000003B9 000001FE
00000485 00000470 0000045F 00000454 00000449 0000043F 00000435 0000042A
000004EA 000004E0 000004D5 000004C9 000004B7 000004AE 0000049B 00000491
0000056C 00000559 00000543 00000532 0000051D 00000511 00000500 000004F5
000005ED 000005D7 000005C6 000005BB 000005A8 00000595 00000582 00000576
00000658 00000645 00000638 0000062B 00000621 00000617 0000060B 000005FF
000006D9 000006CB 000006BF 000006A9 00000694 0000068A 00000675 00000669
00000765 00000757 00000748 00000738 00000723 00000711 000006FF 000006EA
000007DA 000007CD 000007C0 000007B5 000007AA 00000793 00000787 00000770
0000086A 00000857 0000084A 00000834 0000081F 00000813 00000800 000007F1
000008EC 000008E1 000008D5 000008C9 000008B4 000008A7 00000893 0000087E
0000096D 00000960 0000094B 00000935 0000092B 00000916 0000090A 000008FD
000009DF 000009CD 000009BB 000009B0 000009A2 00000990 00000984 00000979
00000A40 00000A34 00000A26 00000A19 00000A0C 00000A01 000009F6 000009EA
00000ACD 00000AC0 00000AAA 00000A95 00000A89 00000A74 00000A67 00000A53
00000B46 00000B37 00000B2A 00000B1A 00000B0C 00000AF8 00000AE8 00000ADA

0BB50000 0BA70000 0B9C0000 0B8E0000 0B820000 0B760000 0B650000 0B5801FE
0C530000 0C3E0000 0C2C0000 0C1C0000 0C060000 0BF40000 0BE30000 0BD00000
0CE10000 0CD00000 0CC10000 0CAA0000 0C9A0000 0C840000 0C740000 0C650000
0D620000 0D540000 0D430000 0D320000 0D230000 0D0E0000 0CFD0000 0CF20000
0E020000 0DF40000 0DE10000 0DCC0000 0DB70000 0DA20000 0D900000 0D790000
0E7A0000 0E6E0000 0E5E0000 0E530000 0E3D0000 0E2F0000 0E210000 0E100000
0F1A0000 0F060000 0EF10000 0EDD0000 0EC60000 0EB10000 0E9C0000 0E850000
0FBE0000 0FAD0000 0F920000 0F770000 0F630000 0F4E0000 0F430000 0F2D0000
10480000 10350000 10270000 10190000 10070000 0FF50000 0FDF0000 0FCA0000
10CC0000 10C00000 10B30000 10A70000 109B0000 10870000 10730000 105D0000
11640000 114F0000 11420000 112D0000 11180000 110C0000 10F70000 10E10000
12020000 11ED0000 11E10000 11CB0000 11B60000 11A10000 118D0000 117A0000
129B0000 12850000 12710000 125E0000 12480000 12330000 12270000 12170000
13280000 131E0000 130D0000 12F90000 12ED0000 12D70000 12C30000 12B00000
13830000 13780000 136D0000 13620000 13560000 134A0000 13400000 13350000
13DD0000 13D10000 13C40000 13B90000 13AD0000 13A10000 13970000 138D0000

00001436 00001428 0000141C 0000140F 00001405 000013F9 000013EB 00000162
0000148C 00001481 00001476 0000146B 00001460 00001455 0000144A 00001440
000014E0 000014D6 000014CB 000014C1 000014B6 000014AB 000014A0 00001496
0000153D 00001532 00001528 0000151B 0000150F 00001504 000014FA 000014ED
00001596 0000158C 00001580 00001575 0000156A 0000155F 00001553 00001548
000015EA 000015DF 000015D4 000015CA 000015C0 000015B6 000015AB 000015A0
00001647 0000163A 0000162D 00001621 00001615 00001609 000015FF 000015F4
000016AF 000016A2 00001695 00001688 0000167B 0000166E 00001661 00001654
00001727 00001719 0000170B 000016FD 000016EF 000016E1 000016D3 000016BC
00001797 00001789 0000177B 0000176D 0000175F 00001751 00001743 00001735
00001806 000017F9 000017EB 000017DD 000017CF 000017C1 000017B3 000017A5
555756CB 5E5FC902 C4830F98 68DF9A04 6AEC8B55 5756CB5E 5FC9FFFF 00001813
C902C483 0F9868DF 9A066AEC 8B555756 CB5E5FC9 02C4830F 9868DF9A 056AEC8B
68DF9A08 6AEC8B55 5756CB5E 5FC902C4 830F9868 DF9A076A EC8B5557 56CB5E5F
8B555756 CB5E5FC9 02C4830F 9868DF9A 096AEC8B 555756CB 5E5FC902 C4830F98
5FC902C4 830F9868 DF9A0B6A EC8B5557 56CB5E5F C902C483 0F9868DF 9A0A6AEC

APPENDIX C

ABSTRACT

There is disclosed technique and apparatus for calibrating a color processing device. The technique includes the steps of comparing a first digital representation of a colored image with a second digital representation thereof and employing at least the transformation to control operation of the color processing device to be calibrated. The first digital representation defines a plurality of first non-scalar color values and the second digital representation defines a plurality of second non-scalar color values corresponding to the plurality of the first non-scalar color values, thereby to provide a transformation pairing each individual one of the first non-scalar color values with a value relatively close to the corresponding one of the second non-scalar color values. The color processing device may be calibrated generally without reference to human aesthetic judgement.

There is additionally provided a method and apparatus for transforming an element of a domain of a first color printing device to an element of a domain of a second color printing device. The method comprises the steps of providing a first transformation from a first digital representation of a colored image to a second digital representation thereof and a second transformation from a third digital representation of a colored image to a fourth digital representation thereof and comparing the first transformation with the second transformation. The second transformation corresponds to the second color printing device, the first transformation corresponds to the first color printing device and the second and fourth digital representations are defined within a single color space.

FIELD OF THE INVENTION

The present invention relates to techniques for tone and color reproduction control in graphic arts.

BACKGROUND OF THE INVENTION

Scanning methods are reviewed in R. K. Molla, Electronic Color Separation, R. K. Printing & Publishing, New York, 1988, the disclosure of which is incorporated herein by reference. The principles of color are explained in G. Wyszecki and W. S. Stiles, Color Science, Wiley & Sons, 1982, the disclosure of which is incorporated herein by reference.

Generally speaking, tone and color reproduction control in high quality graphic arts reproduction is still far from a science. This is particularly evident when a given acceptable result, already realized using given reproduction apparatus, is sought to be realized using other apparatus or using the same apparatus but with a different setting, such as a GCR setting relative to a normal "key black" setting. In such cases, a high degree of expertise, combined with time, effort, expense and patience is required to calibrate the additional apparatus. The results are not always satisfactory.

Unidimensional calibrations in graphic arts, in which a plurality of calibrations are carried out, each being a function of only one color, are known. State of the art techniques include gray balance correction and plotter output calibration techniques. Another example of unidimensional calibration is the automatic TCR (tone and color reproduction) correction process disclosed in published European Application 84307997.1 of Xerox Corporation (Publication number 0144188 A2).

The disadvantage of unidimensional calibrations is that they are only accurate in certain portions of the color space, since a full determination of color is multidimensional, typically having three or four components. For example, the teaching of the above-mentioned published European Application 8437997.1 is relatively inaccurate except in the area of a particular machine's primary color coordinate axes. Gray balance techniques are relatively inaccurate except for a relatively small volume of the color space, comprising gray colors only. Also, the apparatus disclosed in the above-cited published European Application 8437997.1 can be calibrated only by its own output.

Methods of computing a multidimensional function to fit a given set of vectors are known. Interpolative methods may be used if the data is suitably distributed. However the desired conditions regarding the distribution do not always hold in color processing applications, because the data is often not produced directly but rather is the end result of certain procedures (such as scanning, printing, etc.) which are performed on initial preselected data.

An article by Stone et al (Stone, M. C.; Cowan, W. B. and Beatty, J. C., "Color Gamut Mapping and the Printing of Digital Color Images", ACM Transactions on Graphics, 7(4), Oct. 1988, 249-292) discloses use of a colorimeter in mapping a color gamut and printing digital color images, using human aesthetic judgement as a criterion. Human aesthetic judgement is not always the most relevant nor the most efficient criterion for calibrating a color processing device, particularly when it is desired to use another color processing device as a calibration reference. The use of a colorimeter as disclosed by Stone et al is typically cumbersome and time-consuming.

United States Patent 4,500,919 to Schreiber discloses a system for producing color reproductions of an image in which an operator may interactively manipulate a display of the scanned image in order to introduce aesthetic, psychophysically referenced corrections therein. Schreiber teaches that it is desirable for such a system to provide automatic compensation for the effects of ink and paper while allowing the operator to input aesthetic alterations.

United States Patent 4,719,954 to Fujita et al. describes a method and apparatus for creating a color conversion table between scanned colors of a color chart, typically in the Red-Green-Blue (RGB) color coordinate system, and printable colors, typically in the Cyan-Magenta-Yellow-Black (CMYK) color coordinate system, and for using the color conversion table to reproduce a selected measured color in a color specimen. If the selected measured color does not coincide with a value in the color conversion table, an interpolation step is performed.

The method of Fujita et al also includes a correction step when reproduction is performed under different printing conditions. The correction step compensates for the difference between the two printing conditions.

Image creation systems typically comprise a computer with associated graphic software for generating digital representations of color images and/or modifying digital representations of color images, and a plotter or other color output device for transforming the digital representations into analog representations. The analog representation may be created on any suitable substrate, such as on a dia. If desired, e.g. in pre-press applications, the resulting dia can be scanned.

Examples of commercially available graphic software are Photoshop, by Adobe Systems Inc., Mountainview, CA, USA, usable in conjunction with the Mac II by Apple Computer Inc., USA; and PC Paintbrush Plus, by ZSoft, San Francisco, CA, USA, usable in conjunction with the IBM PC. Examples of commercially available plotters are 4cast, by DuPont, Wilmington, DE, USA, and the LVT Model 1620 digital image recorder by Light Valve Technology, Rochester, NY, USA.

SUMMARY OF THE INVENTION

The following terms as used in the present specification and claims should be construed in the following manner:

Analog representation of a colored image: A representation of a colored image which is perceivable by the human eye as a colored image. The representation may appear upon a transparency, a photograph, a CRT display, a printed page, etc.

Digital representation of a colored image: Any representation of a colored image which is expressed in discrete symbols, such as numerical symbols. A common digital representation of a colored image is a digital file comprising a plurality of numerical values corresponding to a plurality of pixels into which the colored image has been divided, each such numerical value representing some aspect pertaining to the colored appearance of the corresponding pixel.

Substrate: Physical apparatus bearing or displaying an analog representation of an image, e.g. transparency, Cromalin (registered trademark), CRT display, photograph, paper, surfaces suitable for painting on, etc.

Range of color processing apparatus: The totality of color values which can be output by the color processing apparatus.

Domain of color processing apparatus: The totality of color values which can be input by the color processing apparatus.

Color processing apparatus: Apparatus which inputs a first representation of a colored image (digital or analog) and converts it into a second representation thereof (analog or digital), thereby to define a transformation from at least a portion of the range into the domain.

<u>Image creation system</u>: Apparatus which creates an image internally or one which takes as input a representation of a color image and modifies it. Such a system can create the color image from geometrical shapes, can alter the shape and can select and/or modify the color of the color image.

<u>Color reading apparatus:</u> Apparatus which inputs an analog representation of a colored image and converts it to a digital representation thereof. e.g., ECSS, DECSS, colorimeters, spectrum analyzers, densitometers. Typically, the digital representation is expressed in a coordinate system such as XYZ, CMYK, RGB, etc.

<u>Printing machine/device/system; output apparatus, recording apparatus etc.:</u> Any apparatus which inputs a digital representation of a colored image and converts it into an analog representation thereof. For example: conventional, offset, gravure, or other printing apparatus employing inks, conventional or direct digital proofing machines, plotters or color recorders which expose photographic materials, electrostatic printing systems employing powder colorants, color monitors, and color CRT displays.

<u>Calibration:</u> Adjusting color processing apparatus in order to obtain representations, having predetermined substantially objective color characteristics, of colored images sought to be processed.

<u>Color value:</u> A representation of a color, typically in a color coordinate system such as but not limited to RGB, $L^*a^*b^*$, XYZ coordinate systems and device dependent coordinate systems such as color head signals e.g. RGB, ink percentages e.g. CMYK, etc.

<u>Colorant, ink, etc.:</u> Any stimulant of the human eye's light energy receptors, typically through emission, transmission or reflection of photons, including liquid colorants, powder colorants, photographic colorants, phosphors, etc.

<u>Colorant</u> <u>values:</u> A digital representation of the amount of a colorant which it is sought to use.

It is appreciated that any references to color, colored images, color values, colorant values, etc. in the present specification are intended to include the instances of black and white as colors or color values, black and white images, black colorant and ink, etc.

The following abbreviations are used:

TCR: tone and color reproduction

GCR: gray component replacement

UCR: Undercolor removal

UCA: Undercolor addition

RGB: red, green, blue. More generally, the term as used herein may refer to any color signals produced by a color reading device. In a color separation scanner, the term normally refers to the color separation signals of the scanner prior to processing thereof.

CMYK: cyan, magenta, yellow, black (colorants such as inks). More generally, the term as used herein refers to any signals which may serve as input for a color printing device.

ECSS: electronic color separation scanner

DECSS: digital electronic color separation scanner

The present invention seeks to provide a technique for multidimensional calibration of graphic arts reproduction apparatus, which simplifies and greatly expedites the process of calibration of graphic arts reproduction apparatus to faithfully reproduce desired color and tone. Preferably, the technique provides generally accurate calibration of the apparatus throughout substantially the entirety of the range of colors producible by the apparatus.

There is thus provided in accordance with a preferred embodiment of the present invention, a technique for calibrating graphic arts reproduction apparatus using color measuring apparatus (such as the "Smart Scanner" available from Scitex Corporation, Herzlia, Israel, colorimeters, densitometers, etc.) including the steps of providing a transformation of or function from first color values to second color values and employing the transformation to control operation of graphic arts reproduction apparatus. The terms "transformation" and "function" are used interchangeably throughout the present specification. The transformation may be stored as a LUT (look up table) and the data may be transferred using any suitable communication method.

The following procedures, among others, may be greatly simplified and rendered more time efficient and effective using preferred embodiments of the present invention:

1. Incorporating a new color separation scanner (CSS), such as a digital electronic color separation scanner, into an existing reproduction system using automatic calibration that emulates the tone and color reproduction of the existing system.

2. Compensating for a different printing or proofing machine or a different setting on the same machine, by adjustment of the tone and color transformation of a digital electronic color separation scanner, or by adjustment of the digital representation of the picture, such that the printed picture characteristics of tone and color are nearly identical notwithstanding which printing machine or setting is employed.

3. Creating upon a first substrate a duplication of an analog representation of a colored image upon a second substrate. Preferably, both substrates are formed of the same medium or of similar media.

4. Restoring an input copy for given color processing apparatus from an available output copy thereof. Typically, the input and output copies are hard copies. Preferably, the restored input copy, if input to the color processing apparatus, will result in an output copy substantially identical to the available output copy.

5. Incorporating a new digital electronic color separation scanner into an existing reproduction system using automatic calibration to achieve emulation of a UCR (under colorremoval), GCR (gray component replacement) or UCA (under color addition) reproduction produced by the existing system, or to emulate any other special reproduction setting to which the existing system may be set.

6. Calibration of a color monitor display with reference to output apparatus, thereby to provide a representation of a colored image on a color monitor display which is substantially identical to a hard copy representation of that image processed on a given printing device.

7. Enabling an image processing device to process digital data defined in a coordinate system other than the coordinate system of the image processing device.

In accordance with a preferred embodiment of the present invention, the above procedures may be carried out automatically or manually in a straight-forward algorithmic manner, substantially without trial and error. The procedures are preferably non-interactive and are without decision points requiring a decision by a human operator. The procedures may be carried out using an electronic color separation scanner having digital tone and color modules, such as the Smart Scanner, commercially available from Scitex Corporation Ltd., of Herzlia, Israel.

Preferably, the color processing device is calibrated such that substantially all inputs thereto may thereafter be satisfactorily processed thereby.

There is thus provided in accordance with a preferred embodiment of the present invention a technique for calibrating a color processing device including the steps of comparing a first digital representation of a colored image with a second digital representation thereof, the first digital representation defining a plurality of first non-scalar color values, the second digital representation defining a plurality of second non-scalar color values corresponding to the plurality of the first non-scalar color values, thereby to provide a transformation pairing each individual one of the first non-scalar color values with a value relatively close to the corresponding one of the second non-scalar color values, and employing at least the transformation to control operation of the color processing device to be calibrated, whereby the color processing device may be calibrated generally without reference to human aesthetic judgement.

Further in accordance with a preferred embodiment of the present invention, the technique is algorithmic.

Still further in accordance with a preferred embodiment of the present invention, the technique is non-interactive.

Additionally in accordance with a preferred embodiment of the present invention, the first and second digital representations are not provided by a colorimeter.

Additionally in accordance with a preferred embodiment of the present invention, the first and second digital representations are not in an XYZ coordinate system.

Further in accordance with a preferred embodiment of the present invention, the first and second digital representations are read by color reading apparatus whose colorimetric response differs from the colorimetric response of the human eye.

Still further in accordance with a preferred embodiment of the present invention, the first and second digital representations are read by color reading apparatus whose colorimetric response is not mathematically transformable to any colorimetric response similar to the colorimetric response of the human eye.

Still further in accordance with a preferred embodiment of the present invention, at least some of the non-scalar color values include a black component.

Additionally in accordance with a preferred embodiment of the present invention, the plurality of first non-scalar color values includes a plurality of 3-dimensional color values.

Further in accordance with a preferred embodiment of the present invention, the plurality of second non-scalar color values includes a plurality of 3-dimensional color values.

Still further in accordance with a preferred embodiment of the present invention, the color processing device includes a color reading device or printing device.

Additionally in accordance with a preferred embodiment of the present invention, the technique also includes, prior to the step of comparing, the step of automatically scanning an analog representation of the colored image, thereby to provide at least one of the first and second digital representations.

Still further in accordance with a preferred embodiment of the present invention, the technique also includes the step of using the calibrated device to create upon a second substrate a duplication of an analog representation of a colored image upon a first substrate.

Additionally in accordance with a preferred embodiment of the present invention, the technique also includes the step of using the calibrated device to create an input copy of a colored image which, when processed by the calibrated device, will result in a given output copy of the colored image.

Further in accordance with a preferred embodiment of the present invention, the technique also includes the step of comparing the second digital representation with a third digital representation of the colored image, the third digital representation defining a plurality of third non-scalar color values, thereby to provide a second transformation pairing each individual one of the second non-scalar color values with a value relatively close to the correpsonding one of the third non-scalar color values and the step of employing includes the step of employing both the transformations to control operation of the color processing device to be calibrated.

Additionally in accordance with a preferred embodiment of the present invention, the color processing device to be calibrated includes a color monitor display.

Still further in accordance with a preferred embodiment of the present invention, the first digital representation is characterized in that processing the first digital representation of the colored image with the color processing device provides a second representation of the colored image which defines a provided plurality of color values, each individual one of the provided plurality of color values being substantially equal to a corresponding one of a predetermined plurality of color values falling within the range of the color processing device.

According to another preferred embodiment of the present invention, there is provided apparatus for sampling the color processing characteristics of a color processing device, the color processing device being operative to convert a first representation of a colored image to a second representation thereof, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device.

Further in accordance with a preferred embodiment of the present invention, the predetermined plurality of color values is characterized in that generally any region of a given size at least partially overlapping the range of the color processing device contains therewithin at least a predetermined number of color values.

Still further in accordance with a preferred embodiment of the present invention, the first representation includes a digital representation or an analog representation.

Additionally in accordance with a preferred embodiment of the present invention, the second representation includes a digital representation.

According to yet a further preferred embodiment of the present invention, there is provided a method of constructing apparatus for sampling the color processing characteristics of a color processing device, the color processing device being operative to convert a first representation of a colored image to a second representation thereof, the method including the step of repeating at least once the steps of providing first and second representations of a colored image, the representations respectively including a first multiplicity of first color values and a second multiplicity of second color values corresponding thereto, the first and second representations being characterized in that processing the first representation with the color processing device defines the second representation, comparing the first representation of the colored image with the second representation thereof, thereby to provide a transformation, characterized in that operating the transformation on each individual one of the second multiplicity of second color values gives a value substantially equal to the corresponding one of the first multiplicity of first color values, and operating the transformation on the first representation of the colored image, thereby to provide a third representation thereof.

Further in accordance with a preferred embodiment of the present invention, the transformation is a function defined and continuous over generally the entirety of the range of the color processing device.

In accordance with a preferred embodiment of the present invention there is provided apparatus for sampling the color processing characteristics of a color processing device, the sampling apparatus being constructed in accordance with a method for constructing sampling apparatus, the method being in accordance with a preferred embodiment of the present invention.

Further in accordance with a preferred embodiment of the present invention, the step of repeating at least once includes the step of repeating at least twice the steps of providing, processing, comparing and operating and for each repetition from the second onward, the first representation of the colored image provided includes the third representation of the colored image provided in the previous repetition.

Additionally in accordance with a preferred embodiment of the present invention, the third representation defines a plurality of color values and the step of repeating at least twice includes the step of repeating the steps of providing, processing, comparing and operating until the plurality of color values defined by the third representation obtained in the last repetition are at a predetermined degree of closeness to a predetermined plurality of color values located within the range of the color processing device.

There is also provided in accordance with a preferred embodiment of the present invention, a technique for quality control of a color processing device operative to convert a first representation of a colored image to a second representation thereof, the technique including the steps of providing apparatus for sampling the color processing characteristics of the color processing device, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device, processing the sampling apparatus on the color processing device, and employing the results of the processing step of control oepration of the color processing device.

There is also provided in accordance with yet another preferred embodiment of the present invention a technique for repeatibility testing of a color processing device operative to convert a first representation of a colored image to a second representation thereof, the technique including the steps of providing apparatus for sampling the color processing characteristics of the color processing device, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device, processing the sampling apparatus on the color processing device; repeating the step of processing on at least one further occasion, and comparing the results of at least two repetitions of the processing steps.

There is provided, in accordance with the present invention, apparatus for transforming an element of a domain of a first color printing device to an element of a domain of a second color printing device and a technique for producing same. The invention is described herein as an apparatus, it being understood that the invention includes a method for performing the operations of the apparatus.

The apparatus includes apparatus for providing a first transformation from a first digital representation of a colored image to a second digital representation thereof and a second transformation from a third digital representation of a colored image to a fourth digital representation thereof and apparatus for comparing the first transformation with the second transformation. The second transformation corresponding to the second color printing device, the first transformation corresponding to the first color printing device and the second and fourth digital representations being defined within a single color space.

Additionally, in accordance with the present invention, the apparatus includes apparatus for storing the output of the apparatus for comparing.

Further, in accordance with the present invention, the output of the apparatus for comparing defines a first plurality of matchings between a first plurality of elements of the domain of the second color printing device and a corresponding first plurality of elements of the domain of the first color printing device and wherein the apparatus for storing include apparatus for providing a second plurality of matchings between the domain of the first color printing device and the domain of the second color printing device, the second plurality exceeding the first plurality in number.

Still further, in accordance with the present invention, the apparatus for storing also includes apparatus for modifying at least some of the corresponding first plurality of elements of the domain of the first color printing device operative prior to the operation of the apparatus for providing a second plurality of matchings.

Moreover, in accordance with the present invention, the apparatus for providing includes apparatus for interpolating between individual ones of the first plurality of matchings, thereby to provide individual ones from among the second plurality of matchings. The apparatus for interpolating includes apparatus for carrying out non-linear interpolation between individual ones of the first plurality of matchings. The apparatus for carrying out non-linear interpolation includes apparatus for fitting a tensor of splines to individual ones of the first plurality of elements of the first domain.

Additionally, in accordance with the present invention, the apparatus of the present invention additionally includes apparatus for employing the stored results to control operation of the first color printing device.

Furthermore, in accordance with the present invention, the apparatus for comparing includes apparatus for searching among the elements of the second digital representation for a plurality of close elements whose values are close to an element of the fourth digital representation, apparatus for forming a multiplicity of subsets, each individual one of the subsets containing some of the plurality of close elements, and apparatus for selecting individual ones from among the multiplicity of subsets. The apparatus for comparing also includes for each individual selected subset, first apparatus for combining the elements of the first digital representation corresponding to the members of the individual selected subset, thereby to define a combination value for the individual selected subset and second apparatus for combining the combination values of each of the individual selected subsets, thereby to provide an element within the first digital representation corresponding to the element within the fourth representation.

Additionally, in accordance with the present invention, the first apparatus for combining includes apparatus for assigning a weight to each member of each individual selected subset, the weights being characterized in that, for each individual selected subset, the element of the fourth digital representation is the center of mass of the weighted members of that subset and apparatus for computing a weighted sum of the members of the individual selected subset. The second apparatus for combining includes apparatus for assigning a weight to each individual selected subset, the weights reflecting the arrangement of the members of the individual selected subset relative to the element of the fourth digital representation and apparatus for computing a weighted sum of the members of the individual selected subset.

Moreover, in accordance with the present invention, the apparatus for selecting includes apparatus for inspecting the arrangements of the members of the multiplicity of subsets relative to the element of the fourth digital representation and apparatus for selecting individual ones from among the multiplicity of subsets in accordance with the result of the step of inspecting.

Still further, in accordance with the present invention, the apparatus includes apparatus for producing a new first transformation using the stored output and apparatus for repeatedly operating the apparatus for comparing and for storing thereby to produce a new transformation between an element of the domain of the first color printing device to an element of the domain of the second color printing device. The apparatus for employing utilize a color converter for converting the domain of the first color printing device to the domain of the second color printing device.

There is also provided, in accordance with the present invention, apparatus for quantifying the appearance of an analog representation of a location of a colored image including apparatus for providing an n-dimensional representation of the location, wherein n is at least 4.

Additionally, in accordance with the present invention, the analog representation of the location is provided by printing a digital representation of the location and wherein the apparatus for providing includes apparatus for providing a 3 dimensional representation of the color of the location and apparatus for computing at least a fourth value as a function of the digital representation of the location.

Alternatively, the apparatus for computing may be replaced by apparatus for measuring the fourth value directly from the analog representation.

Furthermore, in accordance with the present invention, the three dimensional representation is a colorimetric representation which can be CIE XYZ or CIE L*a*b*.

There is additionally provided, in accordance with the present invention, a system for converting between a digital and an analog representation of an image comprising a translation system for translating a reading and writing point across a substrate, a color proofer comprising the writing point for writing, from the digital representation, the analog representation onto the substrate and a color reading system comprising the reading point for reading the digital representation from the analog representation.

Additionally, in accordance with the present invention, the translation system comprises a drum for rotating the substrate and a translating carriage for translating along the drum.

Moreover, in accordance with the present invention, the system includes apparatus for transforming an element of a domain of a first color printing device to an element of a domain of a second color printing device such as described hereinabove.

There is further provided, in accordance with a preferred embodiment of the present invention, a technique for controlling the operation of an image processing device having a first color coordinate system and including the steps of receiving a digital representation of a color image defined in a second color coordinate system, providing a transformation between the first color coordinate system and the second color coordinate system, employing the transformation to transform the digital representation of the color image into a transformed digital representation of the color image in the first color coordinate system and employing the image processing device to modify the transformed digital representation of the color image.

Additionally, in accordance with a preferred embodiment of the present invention, the digital representation is provided by an input device. The second color coordinate system is the coordinate system of the input device.

Furthermore, in accordance with a preferred embodiment of the present invention, the step of employing the transformation is performed by a device having the second color coordinate system. Alternatively, the step of employing the transformation is performed by the image processing device.

There is further provided, in accordance with a preferred embodiment of the present invention, an image processing device having a first color coordinate system including apparatus for receiving a digital representation of a color image defined in a second color coordinate system, transformation construction apparatus for providing a transformation between the first color coordinate system and the second color coordinate system and apparatus for employing the transformation to transform the digital representation of the color image into a transformed digital representation of the color image in the first color coordinate system. The image processing device is operative to modify the transformed digital representation of the color image.

Additionally, in accordance with a preferred embodiment of the present invention, the digital representation is provided by an input device.

Further, in accordance with a preferred embodiment of the present invention, the second color coordinate system is the coordinate system of the input device.

Finally, in accordance with a preferred embodiment of the present invention, the transformation construction apparatus form part of a device having the second color coordinate system.

BRIEF DESCRIPTION OF THE DRAWINGS

Figure 1A:
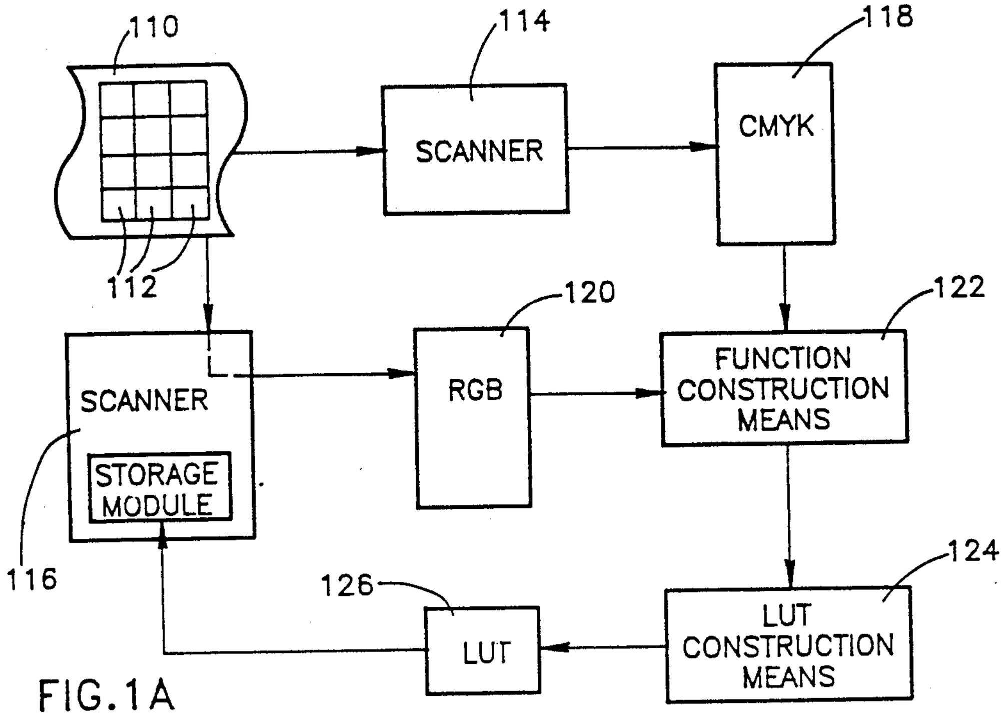
Figure 1B:
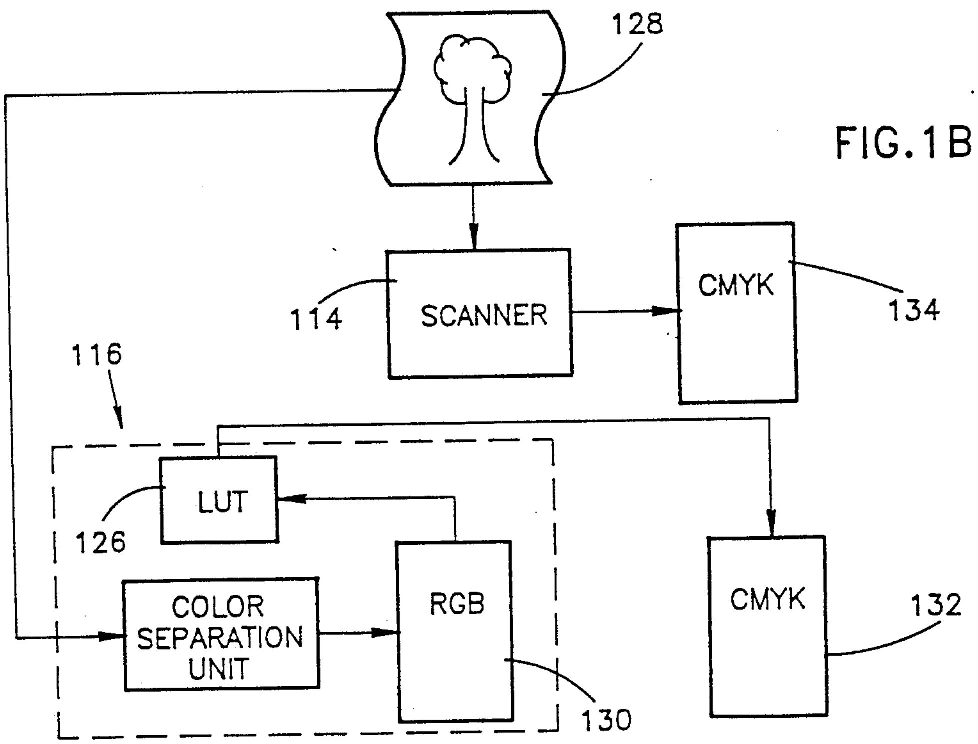
Figure 2A:
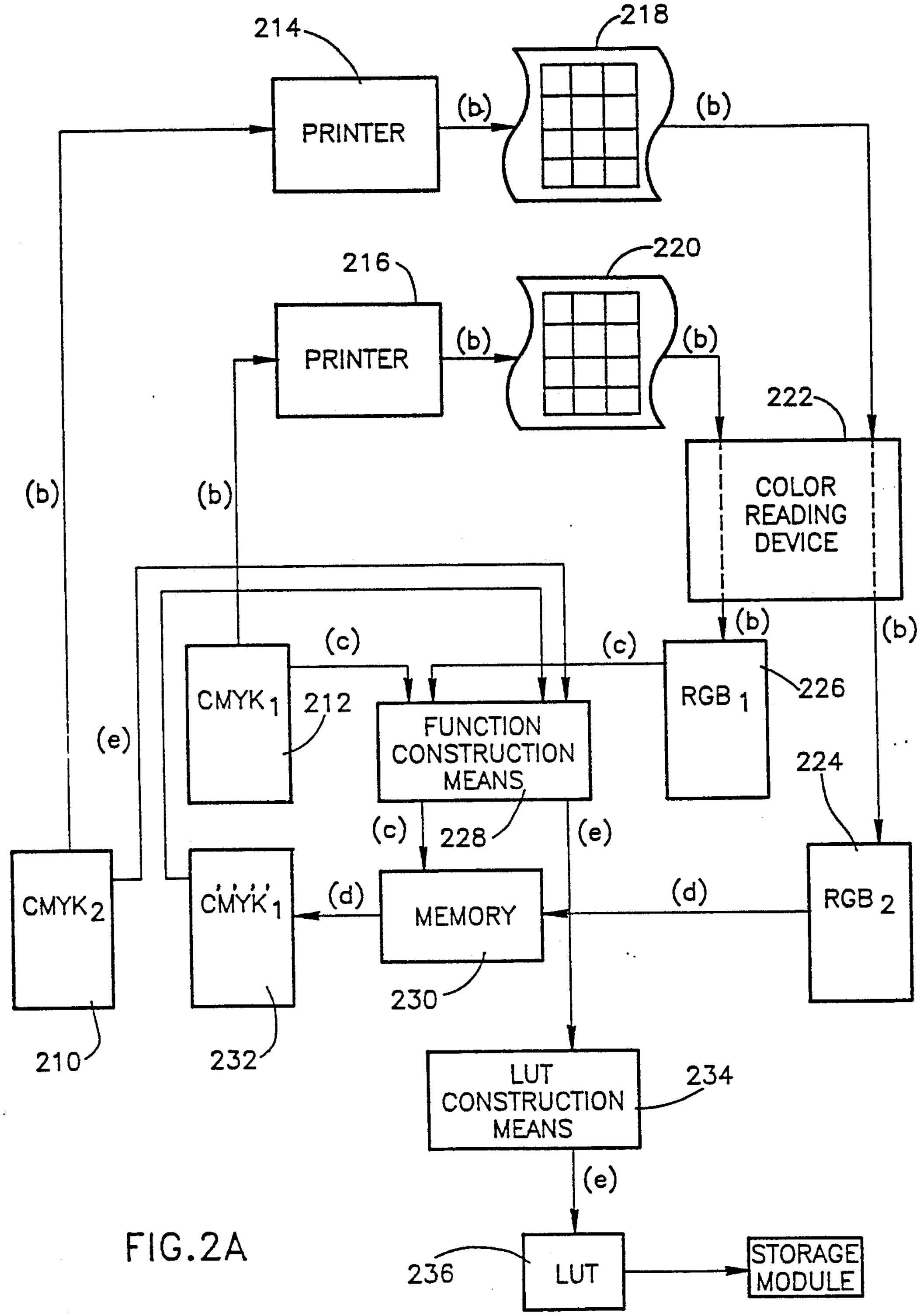
Figure 2B:
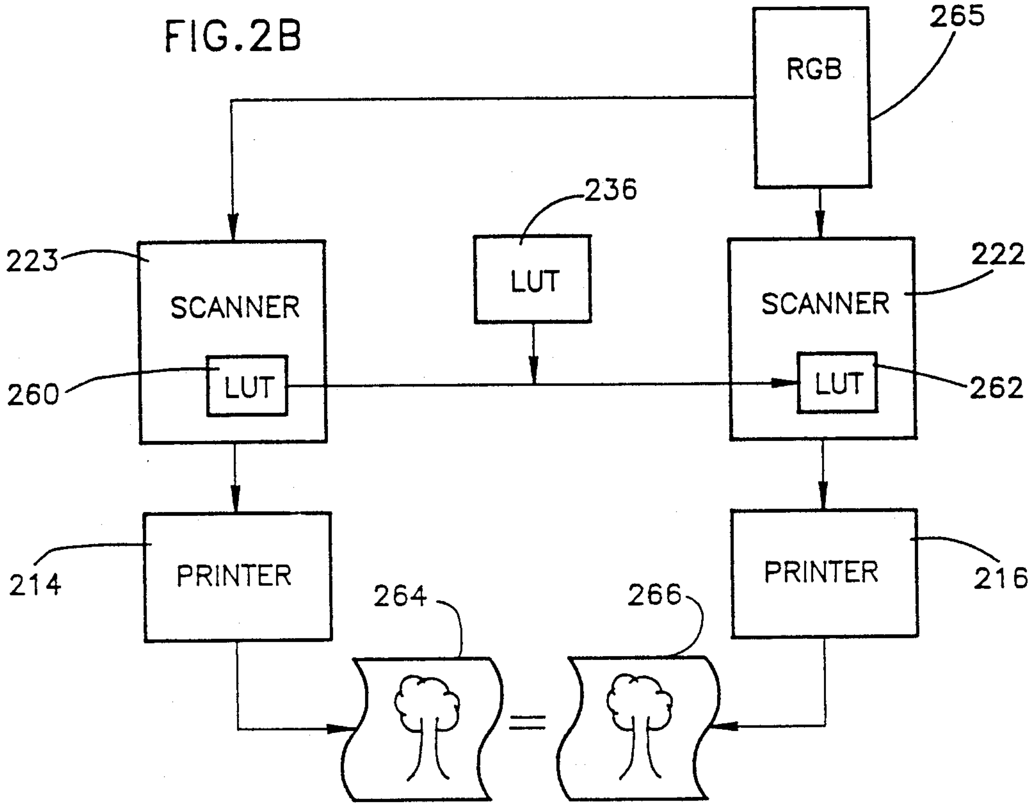
Figure 3C:
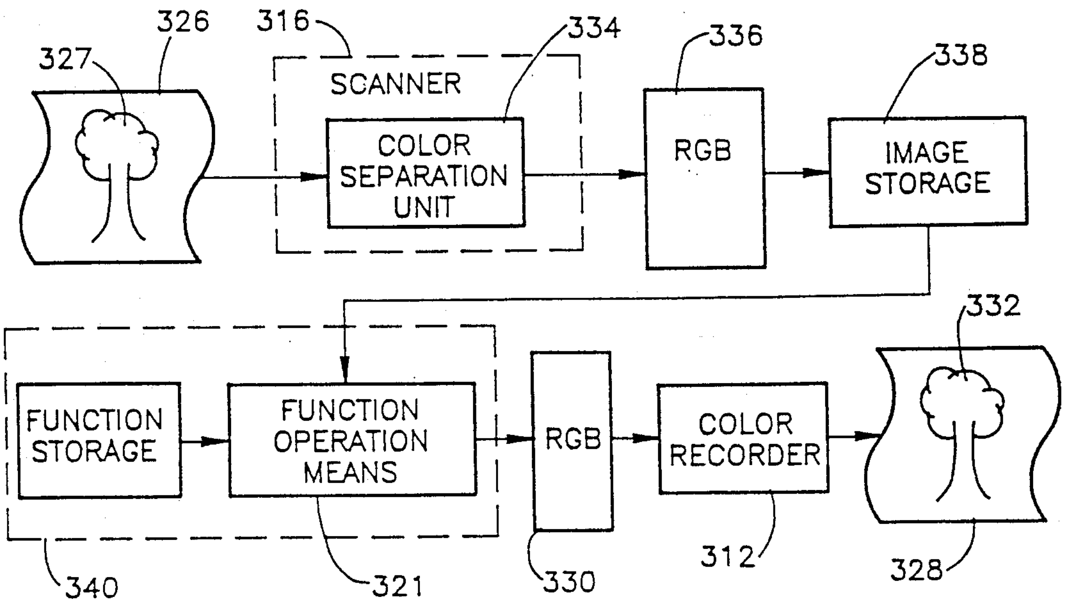
Figure 3A:
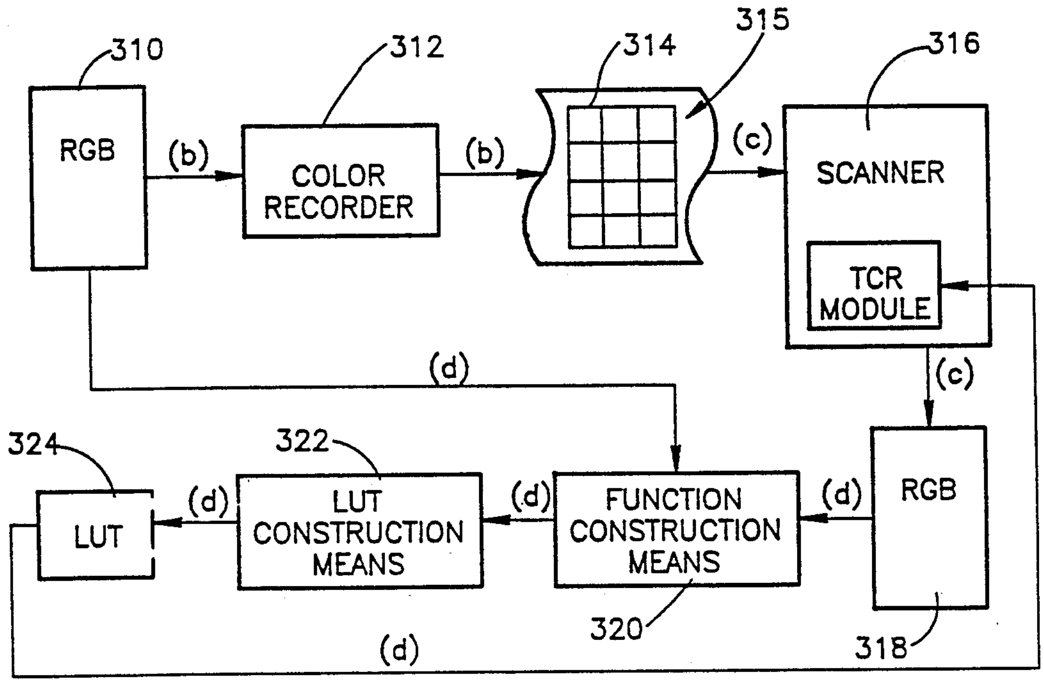
Figure 3B:
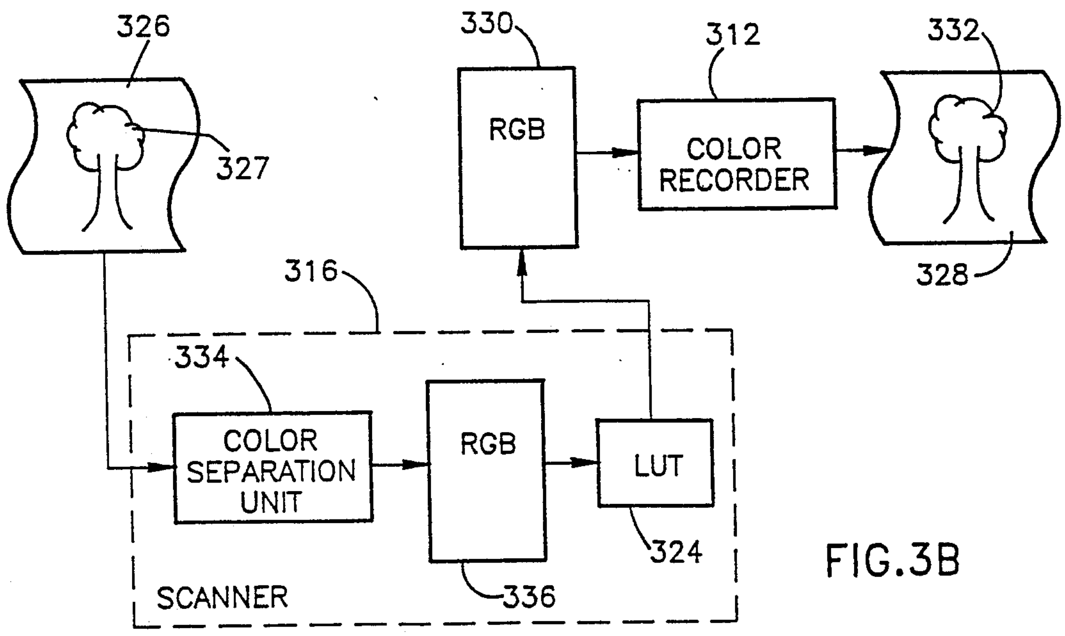
Figure 5A:
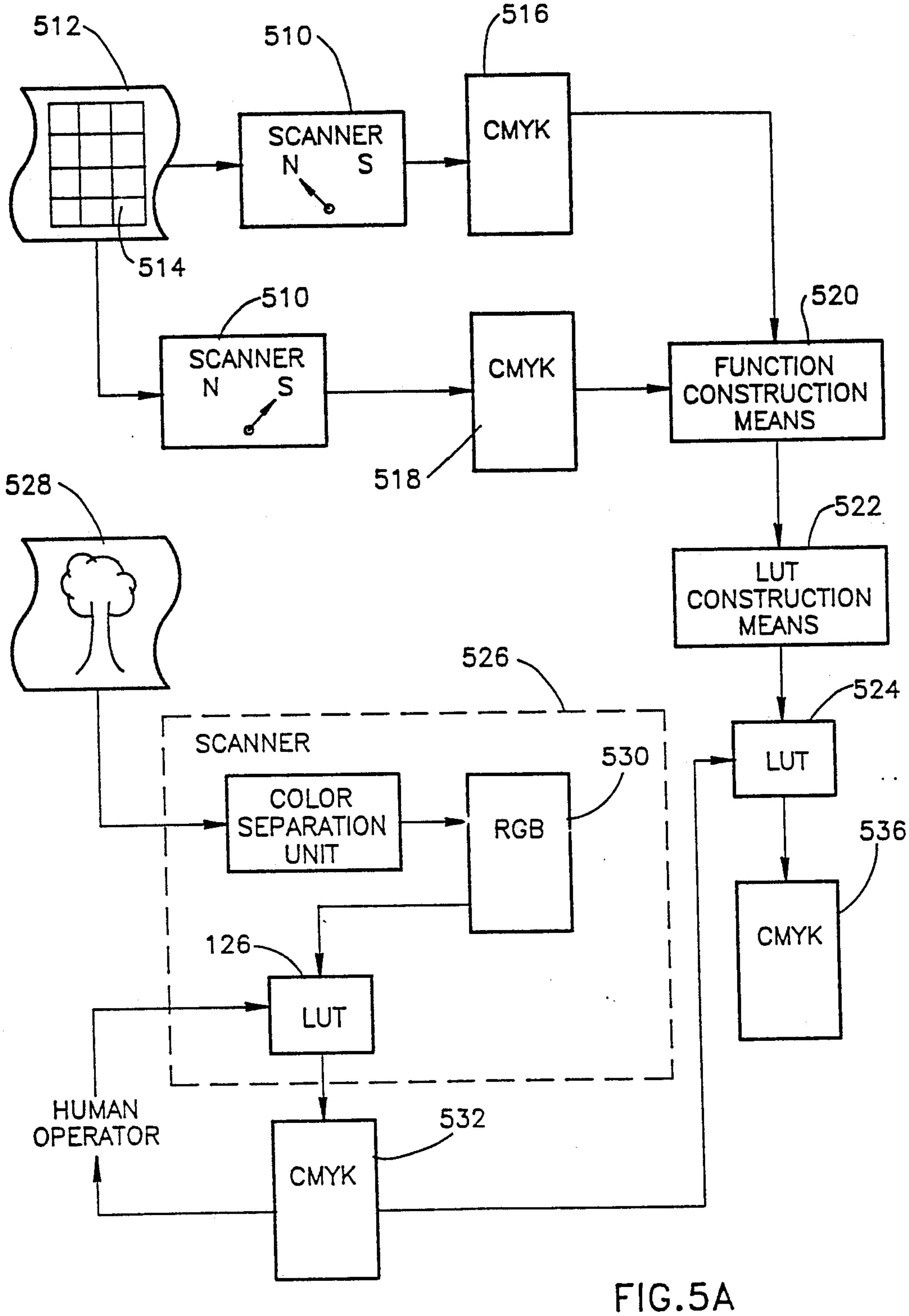
Figure 5B:
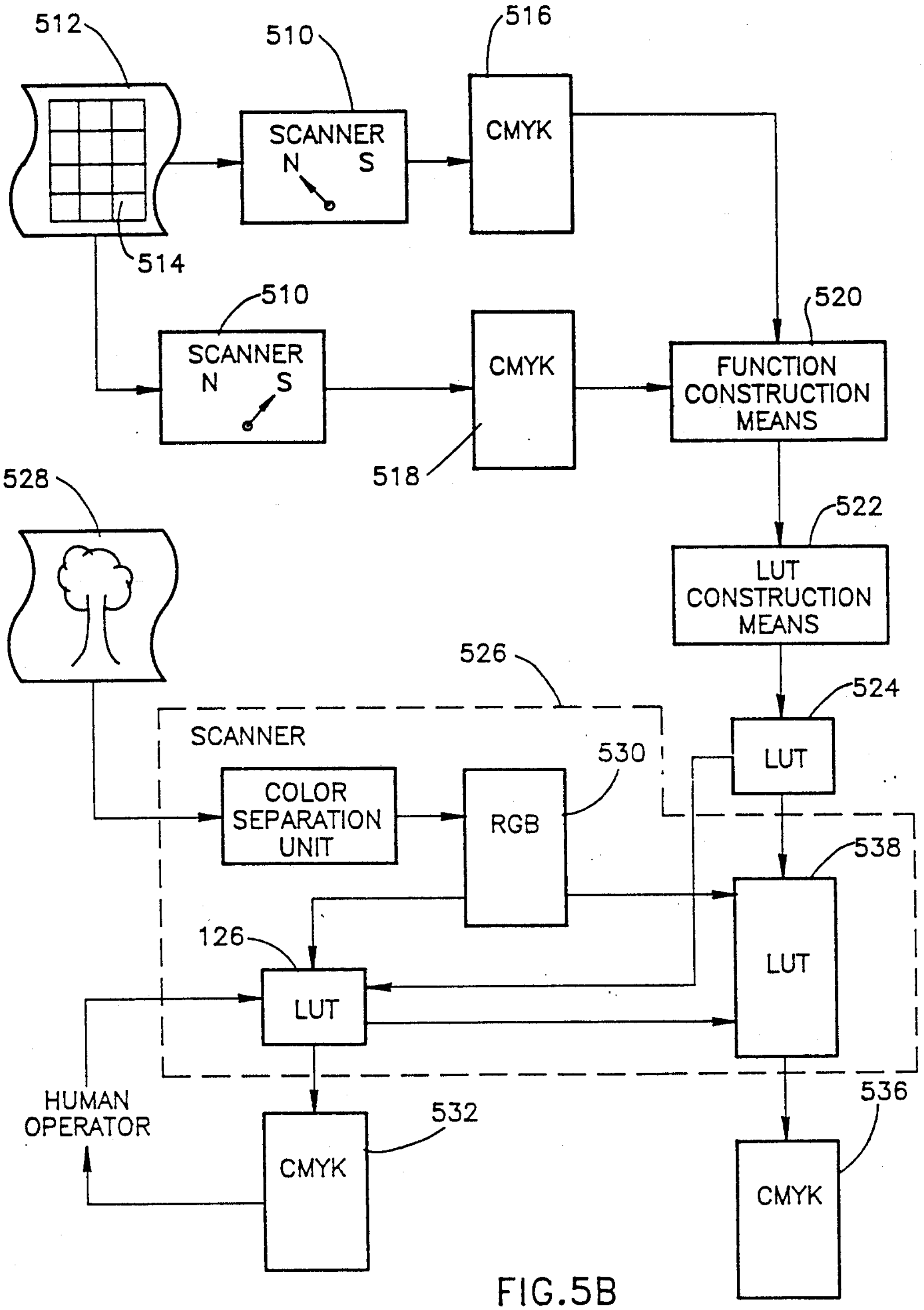
Figure 6:
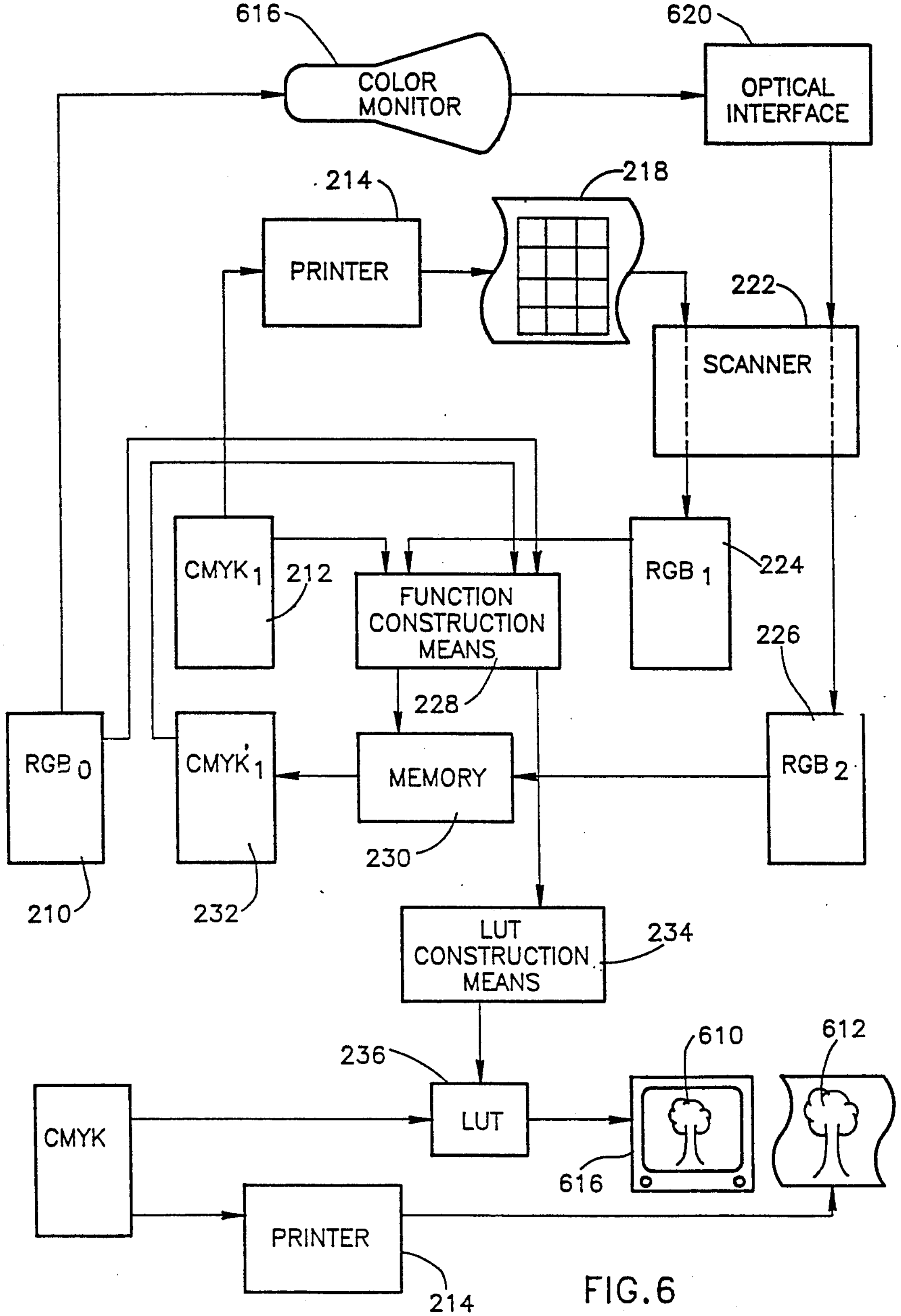
Figure 7A:
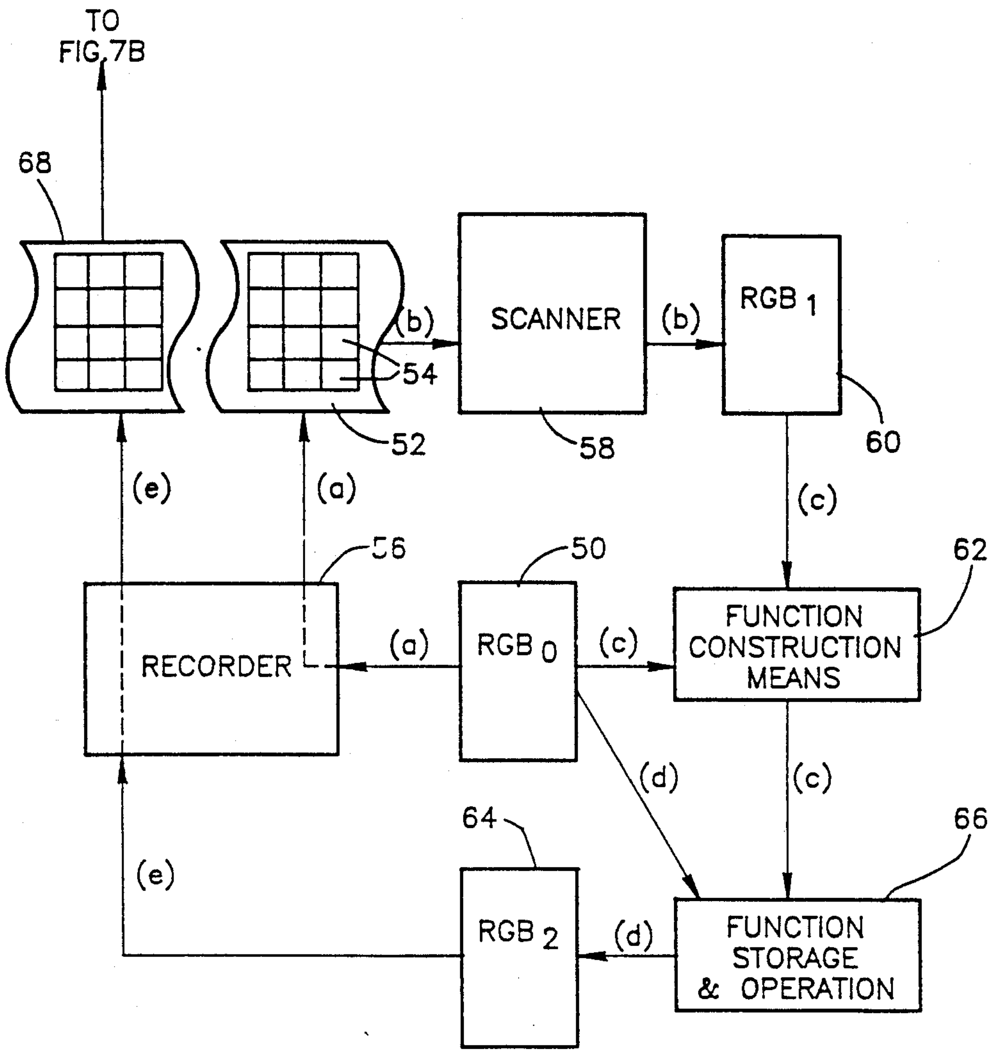
Figure 7B:
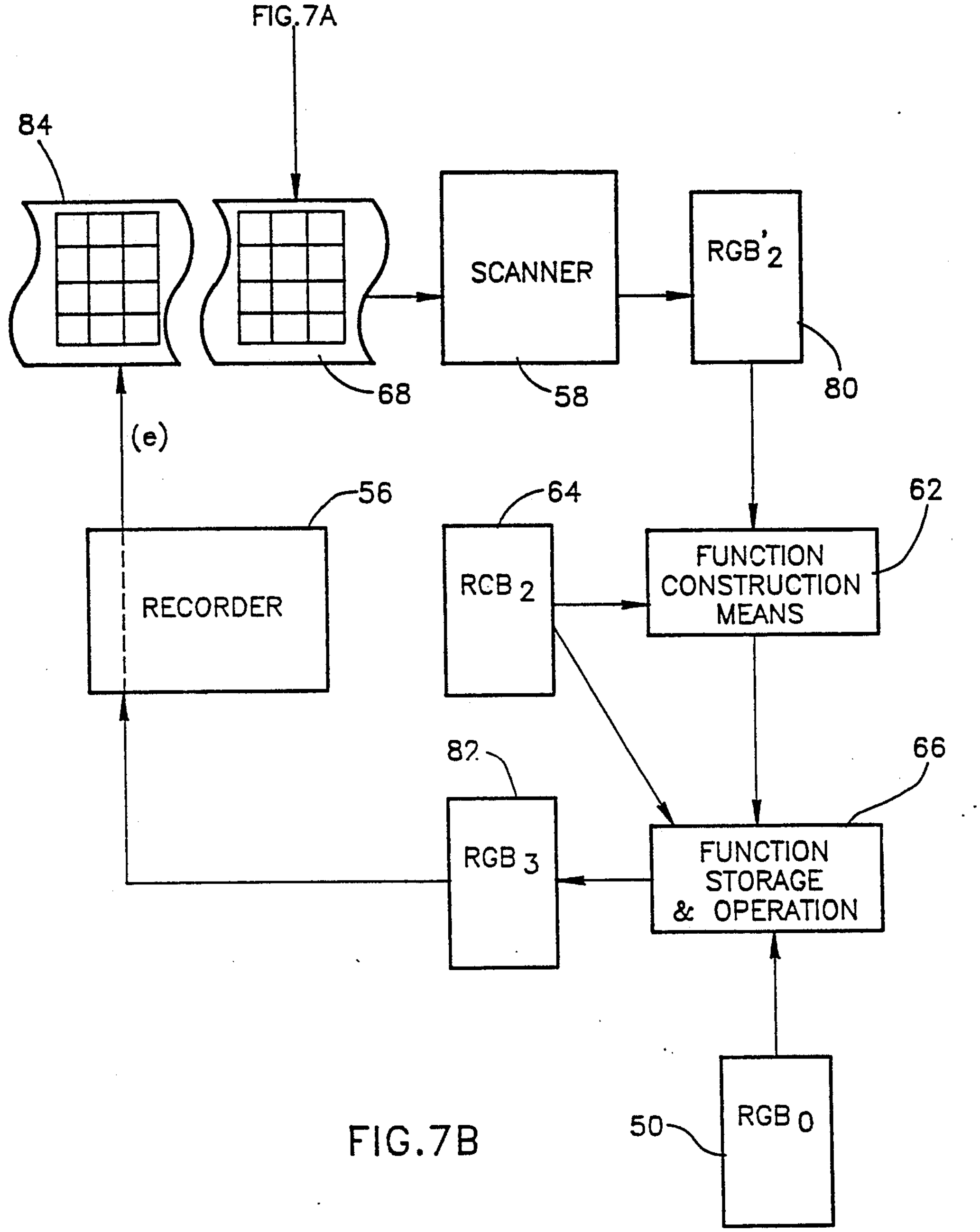
Figure 8:
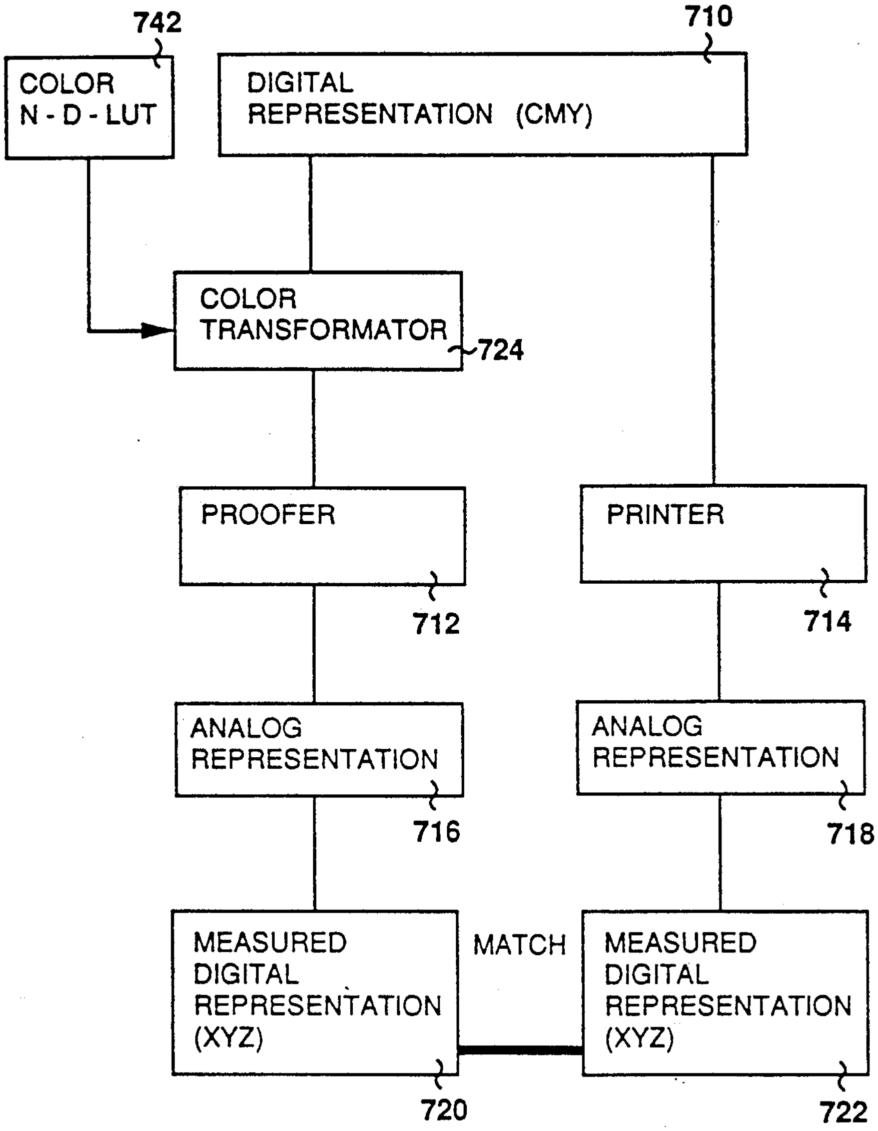
Figure 9:
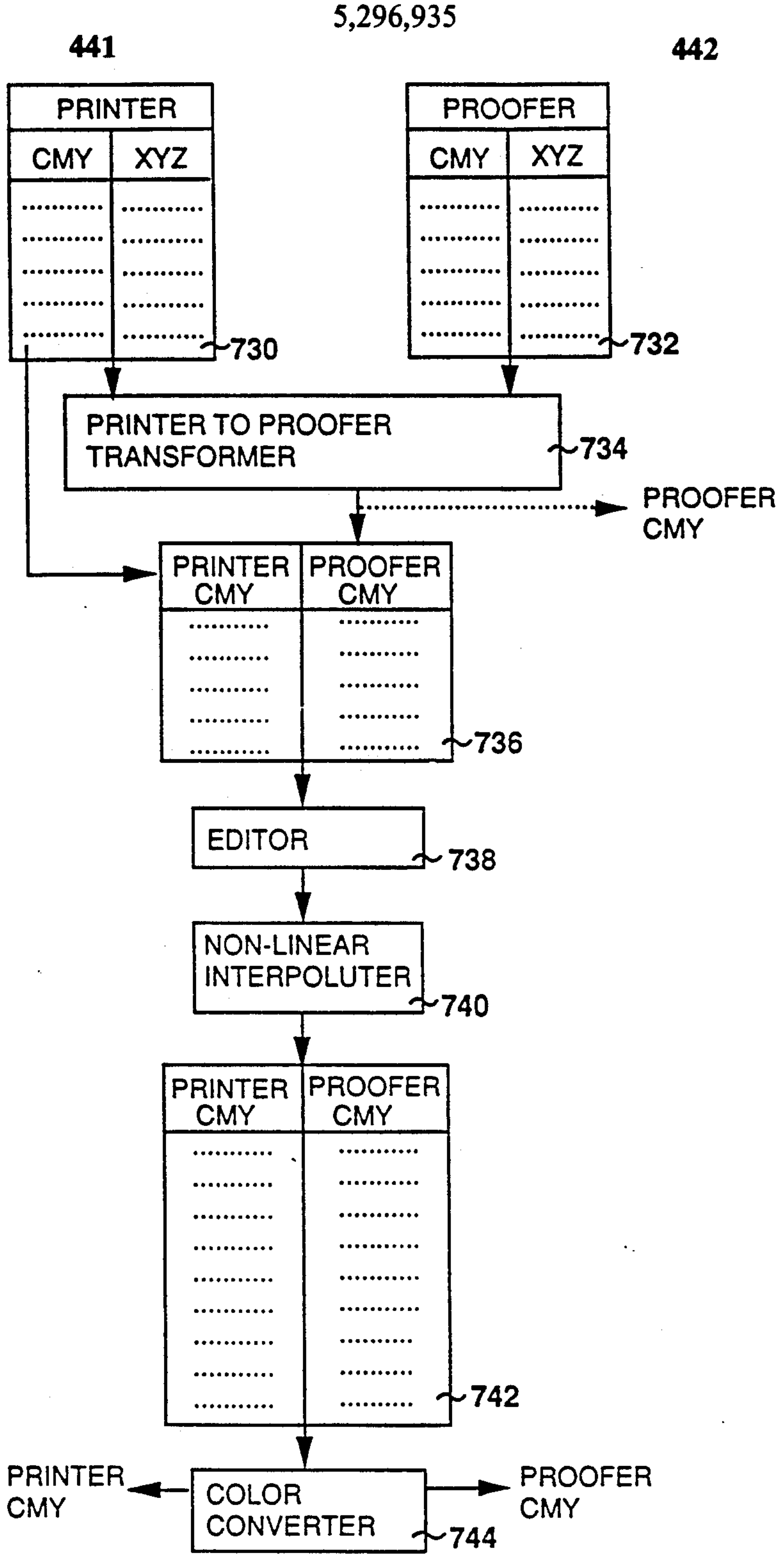
Figure 11:
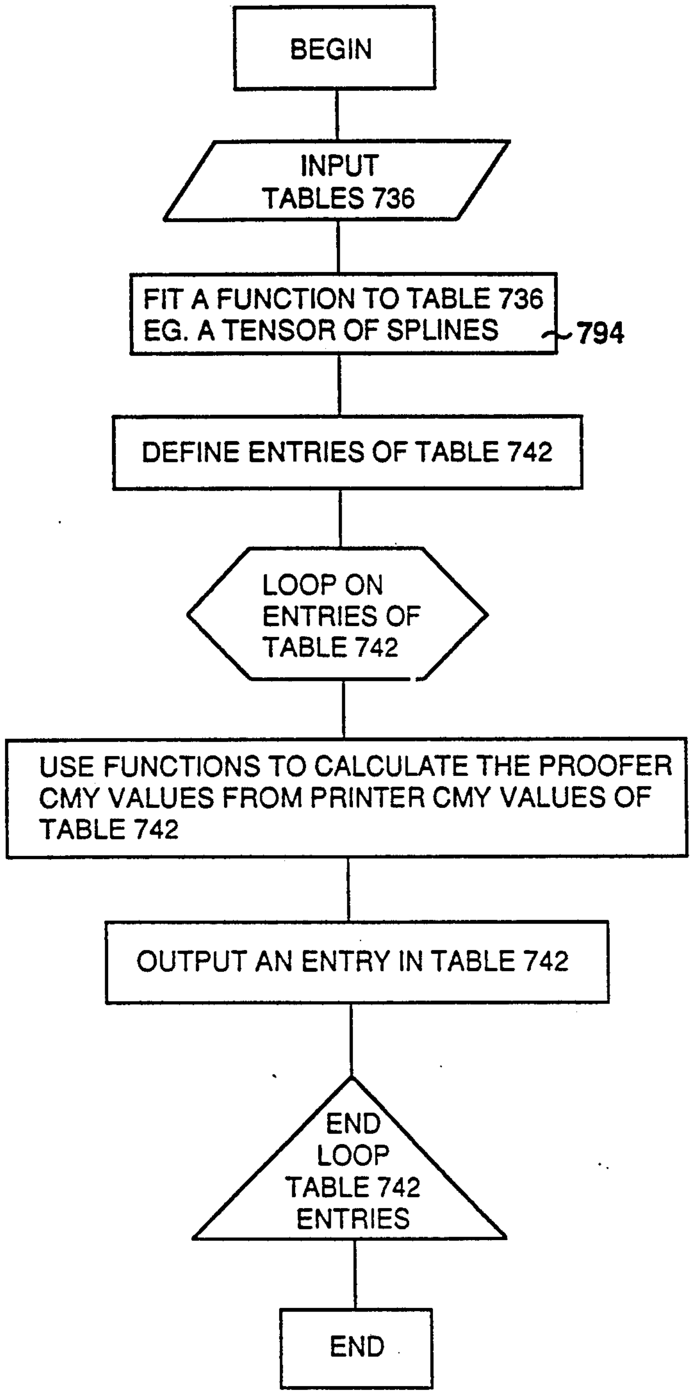
Figure 12:
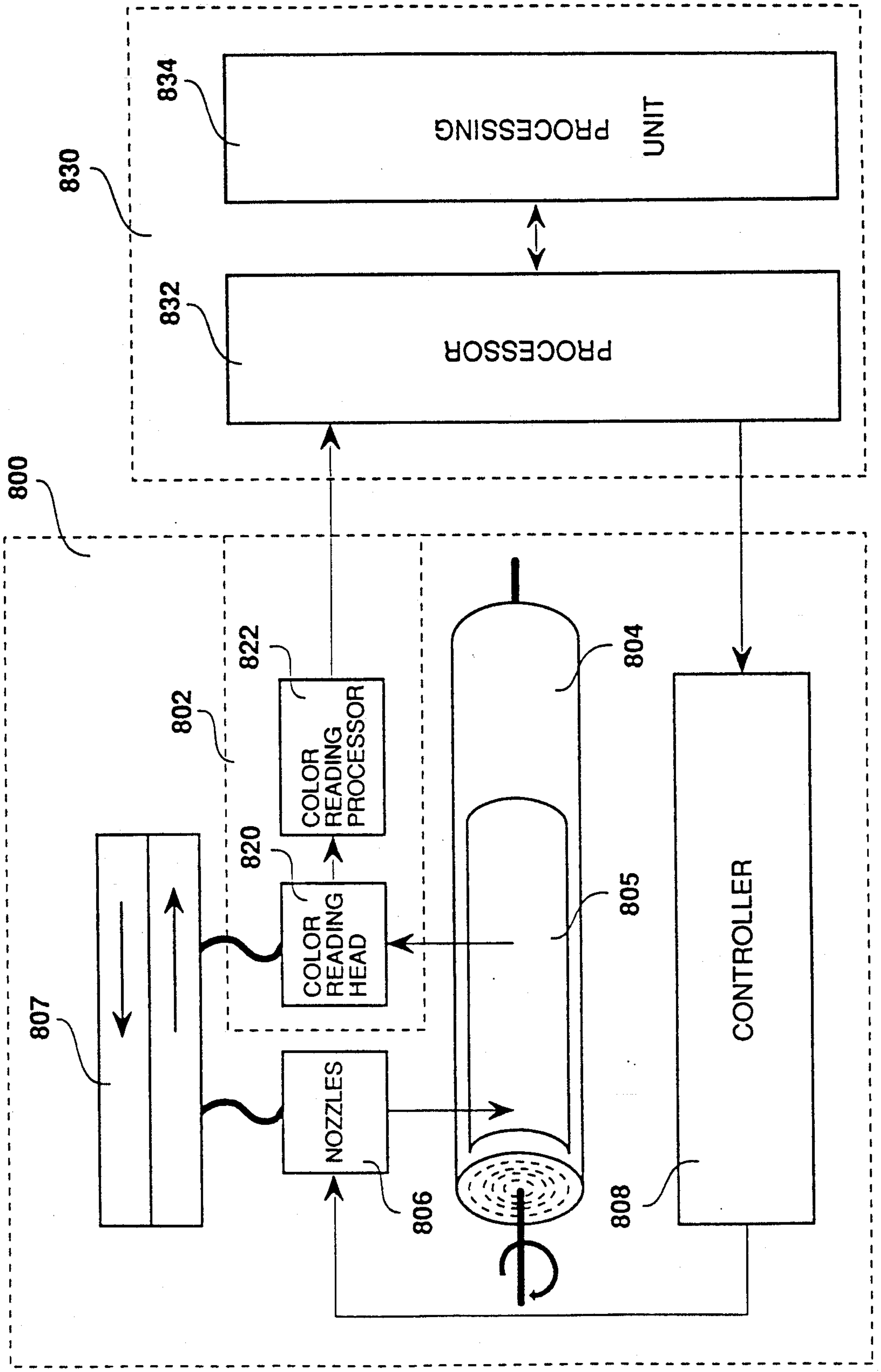

The present invention will be understood and appreciated from the following detailed description, taken in conjunction with the drawings in which:

Figs. 1A and 1B are schematic illustrations respectively of the generation of a calibration transformation or function and its employment in the incorporation of a new color separation scanner or other color reading device into an existing reproduction system employing automatic calibration in accordance with a preferred embodiment of the present invention;

Fig. 2A is a schematic illustration of compensation for a new printing or proofing machine in accordance with a preferred embodiment of the present invention;

Fig. 2B is a schematic illustration of an alternative method of utilizing the calibration information provided by the technique of Fig. 2A;

Figs. 3A, 3B and 3C are schematic illustrations which illustrate respectively a calibration method and two alternative subsequent uses therefor for generating duplications in accordance with a preferred embodiment of the present invention;

Figs. 4A-4E are schematic illustrations of a technique for restoring an input copy from an output copy in accordance with a preferred embodiment of the present invention;

Figs. 5A and 5B are schematic illustrations of the generation of a calibration transformation or function and its employment in incorporation of a new digital electronic color separation scanner in an existing system for producing UCR, GCR and UCA and any other special setting tone and color reproductions, in accordance with respective alternative embodiments of the present invention;

Fig. 6 is a schematic illustration of a method for calibration of a color monitor display with reference to output apparatus in accordance with a further preferred embodiment of the present invention;

Figs. 7A-7B are schematic illustrations of a reiterative method for providing an improved database for sampling the color processing characteristics of color processing apparatus;

Fig. 8 is an alternative embodiment of a system for performing the method of Figs. 2A and 2B;

Fig. 9 is a block diagram illustration of a technique for transforming a domain of a first color printing device to a domain of a second color printing device, operative in accordance with an alternative embodiment of the present invention;

Fig. 10 is a flow chart illustration of a CMY-CMY conversion technique useful in the technique of Fig. 9;

Fig. 11 is a flow chart illustration of an interpolation technique useful in the embodiment of Fig. 9;

Fig. 12 is a block diagram illustration of a system for reading and writing an image constructed and operative in accordance with the present invention;

Fig. 13 is a general block diagram illustrating apparatus for calibrating a scanner to an image processing unit to a scanner, the apparatus being constructed and operative in accordance with an alternative embodiment of the present invention; and Fig. 14 is a general block diagram illustrating use of the apparatus of Fig. 13.

DETAILED DESCRIPTION OF PREFERRED EMBODIMENTS

It is an object of the present invention to provide a technique for multidimensional and preferably full range calibration of graphic arts reproduction apparatus, which simplifies and greatly expedites the process of calibration of graphic arts reproduction apparatus to faithfully reproduce desired tone and color. The calibration is accomplished by:

(a) providing a database comprising a set of color values representing a colored image which it is sought to reproduce by using output apparatus employing a plurality of inks or other colorants in amounts defined by the set of color values; and (b) computing a color calibration function or transformation which fits the database and allows accurate interpolation procedures to be carried out on all color values which are reproducible by the apparatus employed, although only a subset of these values were included in the original database. The function also preferably allows accurate extrapolation procedures to be carried out on color values which fall outside of the convex hull spanned by the color values in the database. Preferably, the function is stored as a look up table (LUT). Alternatively, it can be stored in any other suitable form, such as an analytic formula, etc.

The step of computing a color calibration function

A mathematical formulation of the problem is as follows: given a set of p points defined in a d-dimensional input space and given n sets, each comprising p scalars, to which scalars the points respectively correspond. Each set is contained within a unidimensional space, the n unidimensional spaces corresponding to the n coordinates defining the output space. Find n relatively smooth functions $f_1 \ldots f_n$ from the d-dimensional space to each of the n unidimensional spaces, such that each of the functions generally fits the data, thereby to allow generally accurate interpolation.

For example: p=1676, d=3, n=4. The p points are 1676 RGB values read by a color reading device, each value being an ordered 3-member set (r, g, b) defining the respective quantities of Red, Green and Blue detected at each of 1676 locations upon a multicolored input image which is to be read. The values r, g and b are scalars and 0 <= r, g, b <= 255. Each of the p points of the multicolored input image is to be represented by an output image using Cyan, Magenta, Yellow and Black inks (which define four unidimensional spaces), in quantities respectively represented by positive variables c, m, y and k. Four functions, each defined from the three dimensional (r, g, b) space to a respective one of the four one-dimensional c, m, y and k spaces, are to be computed, which will respectively determine the quantity of each of the four inks which is to be provided to reproduce any particular color (r, g, b).

Any suitable device can be employed to "read" the color values of the database in any of the various embodiments described herein. Inter alia, any of the following devices may be employed: colorimeters, analog electronic color separation scanners, digital electronic color separation scanners, densitometers, spectrum analyzers.

Any suitable color reading device may be used as a calibration reference, such as the Smart Scanner available from Scitex. In some applications, such as Application No. 2 described hereinbelow, it may be desirable to use a scanner whose colorimetric response is similar to that of the human eye, or a scanner whose colorimetric response is mathematically transformable to a response similar to that of a human eye. Any coordinate system suitable for the particular application may be used to represent the color values (XYZ, RGB, etc.). Preferably, substantially all of the colors of the reference color space should be distinguishable by the device used as a calibration reference.

The procedure disclosed hereinbelow is relatively insensitive to the selection of the particular set of p points. In particular, the selected points need not be arranged at regular intervals and do not even need to be distributed homogeneously. However, it is generally preferable to provide a minimum density of data distribution throughout the color space or subspace of interest.

A preferred procedure for computing each function is as follows:

a. Define a set of boxes in the d-dimensional input space. The boxes are preferably selected to be of more than one size, preferably of two different sizes. The set of boxes of each particular size covers the entire d-dimensional space, preferably with overlap. Preferably, the length of the side of each box will be 1/16 to 1/2 of the length of each dimension of the d-dimensional input space, and the boxes will be defined such that the centers thereof are spaced at intervals which are half of the lengths of the sides of the boxes.

For example, and with reference to the numerical example outlined above with eight-bit color values, d=3 and the d-dimensional space is the (r,g,b) cube $[0,255]^3$. In this instance, two sets of boxes may be defined. Each of the $5^3$ boxes in the first set is of dimensions $128^3$, and each of the $9^3$ boxes in the second set is of dimensions $64^3$. Boxes of the first set may be defined throughout the cube at intervals of 64 units along each of the three dimensions, beginning at the origin (0,0,0). Boxes of the second set may be defined throughout the cube at intervals of 32 units along each of the three dimensions, beginning at the origin (0,0,0). If a box defined as above is not entirely contained within the d-dimensional space (such as the boxes whose centers are at the origin, only 1/8 of which are contained within the d-dimensional space), the box is defined as the overlap of the box (when defined as above) with the d-dimensional space. For example, the first box in the first set will be $[0,64]^3$.

b. Approximate the transformation within each box by computing a function from that box to the (c,m,y,k) space which optimally fits the data points within that box. Any suitable curve fitting method may be used, such as the methods described in chapter 4 of J. Stoer, Introduction to Numerical Analysis, Springer-Verlag, New York, 1980.

If linear approximation methods are used, it is desirable, in the present example, that there be at least 10 points in each box of dimensions $64^3$, including those boxes which are only partially contained within the d-dimensional space, such as the box whose center is at the origin. Therefore, there should preferably be a more dense distribution of points near the periphery of the d-dimensional space.

c. For each of the p points in the input space (or, if the function is stored in LUT form, for each of the LUT points), define the function at that point as a weighted sum of all the approximating functions from all the boxes (some of the weights may be zero). The weight assigned to each approximating function in the weighted sum typically decreases with the size of the corresponding box and with the distance between the center of the corresponding box and the point and increases with the number of points contained within the corresponding box. According to one preferred embodiment of the present invention, a nonanalytical function may be used. According to a further preferred embodiment of the present invention, an analytical formula may be used. One such analytical formula giving the weight for the value of the approximation function $f_i$ derived from box i at a point $x_j$ in box j is:

$$\text{weight}(f_i, x_j) = \frac{(\text{number of points in box } i)}{(\text{volume of box } i) \times (\text{distance of point } x_j \text{ from center of box } i)^2}$$

The weights are non-negative. For each $x_j$, they sum to unity over the totality of boxes of all sizes.

These computations may be performed by any suitable computer or by a suitable digital electronic color separation scanner such as the Smart Scanner available from Scitex. Appendix A is a computer listing of a procedure which inputs a plurality of p d-dimensional color values and a plurality of sets containing p scalars each, and uses the above method to output a color calibration LUT in accordance with a preferred embodiment o: the present invention.

Alternative procedures for computing each function $f_1 \ldots f_n$ are:

1. Using a regular grid to order the input or output data, and inverting one of the transforms, as disclosed in the above-referenced article by Stone et al, the disclosure of which is incorporated herein by reference; or 2. Using iterative methods to optimize a sample of the values of the function. Iterative methods are described in chapter 8 of J. Stoer, Introduction to Numerical Analysis, Springer-Verlag, New York, 1980.

It is noted that the above procedures are merely illustrative of the type of mathematical procedures which could be used to compute color calibration functions or transformations having the characteristics specified above.

The step of providing a database

As stated hereinabove, the method of the present invention includes the step of providing a database comprising a representation of a plurality of colors, which database may then be processed by color processing apparatus. To continue the above numerical example, the original database, whose characteristics can be directly controlled by the operator, are the unprocessed RGB values and these values may be recorded, e.g. on a transparency, and then scanned. The data which forms the basis for the function construction procedure described above will then be the processed data, i.e. the transformed form of the original database obtained by processing (recording and scanning) the original database.

It is therefore appreciated that a "good" database for sampling the operation of color processing apparatus over a range or subrange thereof has the property that, once processed by the color processing apparatus, it will, for generally any region of a predetermined size overlapping or contained within the range or subrange, include at least a predetermined number of color values located interiorly of that region. A more general requirement for a "good" database is that, once processed, it is of a predetermined degree of closeness to a "target" comprising a predetermined plurality of color values. However, it is generally the case that if a database which possessed this property prior to being processed is subsequently processed by the color processing apparatus, the processed data will no longer possess the desired property but rather will be "distorted" due to the transformations of the data induced by the color processing procedure.

The color calibration function computation procedure described above can be used in accordance with the method described hereinbelow to produce a "good" database, in the sense set forth hereinabove, from an initial database which may be far from possessing the desired characteristic set forth hereinabove. According to one preferred embodiment, the initial database, prior to being processed by the color processing apparatus, comprises a set of points distributed generally evenly throughout generally the entirety of the domain of the apparatus.

The improvement process of the initial database may, if desired, be continued iteratively until any desired degree of "quality", in the sense described hereinabove, of the final database, is attained. Typically, only three or less such iterations are necessary.

A preferred method in which the function construction procedure described hereinabove is used to provide an improved database will now be described with reference to Figs. 7A-7B, which are schematic illustrations of the steps of the method. Each of steps (a) - (e) of the method is designated in Fig. 7A by the appropriate letter. Step (f) is illustrated in Fig. 7B.

It is appreciated that the method of Figs. 7A-7B may be employed to construct a first database which, once processed by given color processing apparatus, provides a second, processed database which defines a plurality of color values, each of which is substantially equal to a corresponding one of any predetermined "target" plurality of color values physically obtainable by means of the color processing apparatus. The steps illustrated in Fig. 7A are as follows:

(a) Provide an initial digital representation 50 of a colored image, the colored image comprising a plurality of colored locations. The digital representation 50 comprises a plurality of color values such as RGB values, to be referred to as "$RGB_0$ data", which corresponds to the plurality of colored locations. An example of a preferred initial database 50 useful in deriving a final database for using a Smart Scanner (commercially available from Scitex Corporation, Herzlia, Israel) for sampling the operation of a 4cast color recording device (commercially available from DuPont) is disclosed in Appendix C. The corresponding final database, provided in accordance with the method of Figs. 7A-7B, is disclosed in Appendix D.

Record the $RGB_0$ data with a color recording device 56 (such as a 4cast, commercially available from DuPont) to obtain an analog representation 52 of the colored image comprising a plurality of colored locations 54. Preferably, the initial digital representation 50 of the initial colored image will span generally the entirety of the color coordinate system defined by the color recording device.

(b) Read the image 52 using desired input apparatus 58, thereby defining a plurality 60 of color values such as RGB values, to be referred to as "$RGB_1$ data", which correspond to the plurality of colored locations 54. It is noted that, generally, the $RGB_1$ data obtained from the original $RGB_0$ data by recording and scanning will no longer have the same values as the original $RGB_0$ data. If the values of the $RGB_1$ data are not sufficiently close to a "target" predetermined plurality of color values, follow steps (c) to (f) below:

(c) Compute a function $f_1$ from the $RGB_1$ data 60 to the $RGB_0$ data 50 by pairing each $RGB_1$ datum with the value of the corresponding $RGB_0$ datum and by using the color calibration function construction method described hereinabove. The computation and storage of the color calibration function may be performed by any suitable computation means 62 and storage means 66 respectively. Two software implementations of computation means 62 in conjunction with storage means 66 are disclosed herein as Appendix A (hardware environment: Prisma System workstation, commercially available from Scitex) and Appendix B (hardware environment: Smart Scanner, commercially available from Scitex).

(d) Define $RGB_2$ data 64 by operating $f_1$ on each of the $RGB_0$ values. The $RGB_2$ data is a digital representation of an "improved" database (relative to the initial $RGB_0$ database) in the sense described hereinabove with reference to the term "good" database. The operation of function $f_1$ on the data 50 may be performed by any suitable means 66, such as the Scitex Smart Scanner or any conventional computer such as an IBM PC.

(e) If an analog representation of the improved database is desired, output the $RGB_2$ file 64, which may be stored by any suitable means, such as the storage module of the Smart Scanner, using color output device 56 as a color printing device and using a substrate 68 of a medium generally identical to the medium of the substrate 52.

(f) If it is desired to continue the above procedure to obtain a still further improved database, i.e. a database whose values are still closer to the "target" predetermined plurality of color values, continue as in Fig. 7B: Provide a digital representation of the output 68 of (e), as in (b), using input apparatus 58, thereby defining a plurality of color values such as RGB values, to be referred to as "$RGB'_2$ data" 80.

Define a function $f_2$ from the $RGB'_2$ data 80 to the $RGB_2$ data 64 and store it in module 66, as in (c) above.

Define and store $RGB_3$ data 82 by operating $f_2$ on each of the $RGB_2$ values 64, as in (d) above.

If desired, output the $RGB_3$ data file, as in (e) above. The resulting picture 84 is an analog representation of the still further improved database.

The reiteration or loop of Fig. 7B may be repeated as many times as desired to cause the resultant database to approach the "target" predetermined plurality of color values to any desired degree of closeness.

It is appreciated that the method of providing a data base and the method of computing a color calibration function, both as shown and described hereinabove, have a wide variety of applications when used independently or in conjunction with one another. For example, the method of providing a database described hereinabove is useful not merely for the purpose of computing a color calibration function as described hereinabove, but also in any situation in which it is desired to sample the functioning or the characteristics of color processing apparatus, e.g. in quality control and repeatability test situations such as those presented in the foregoing examples. It is appreciated that the foregoing examples are merely illustrative of possible applications in which it is desired to sample the functioning or the characteristics of color processing apparatus.

<u>Example A:</u> A typical situation in which the method of providing a database as shown and described hereinabove is useful in quality control is that of a printing machine or other output apparatus which is found to produce somewhat varying output as a function of fluctuating environmental factors. A database designed to sample the characteristics of the printing machine, constructed in accordance with the method shown and described hereinabove, may be printed periodically on the printing machine. The database is preferably constructed to sample the printing of colors which are known to be sensitive or problematic when printed on that particular machine. The hard copy is then scanned and a suitable color calibration function is constructed to compensate for any drift which may have occurred relative to a previously defined standard.

Example B: The method of providing a database may also be useful in quality control of color reading apparatus such as scanners. For example, if a scanner is thought to be defective, a database designed to sample the characteristics of that scanner, constructed in accordance with the method shown and described hereinabove, may be scanned by the putatively defective scanner and the result compared to the results of scanning the same database using results from a scanner known to be properly functional. The database is preferably constructed to sample the scanning of colors which are known to be sensitive or problematic when scanned on that particular scanner.

It is appreciated that the above examples are merely illustrative of possible quality control applications. The term "quality control" is here employed to describe any application in which the quality of performance of color processing apparatus is of interest. More generally, it also applies to any situation in which it is of interest to sample the performance of color processing apparatus.

Example C: A typical situation in which the method of providing a database as shown and described hereinabove is useful in repeatibility control is that of a scanner which is suspected of being improperly functional for a certain subregion (or the entire region) of the output space, comprising a plurality of colors. The database provision method shown and described hereinabove may be employed to provide a transparency or other representation which, when scanned, will be mapped onto the subregion in question. This transparency may be used to test the scanner and effect suitable corrective procedures thereupon. It is appreciated that this example is merely illustrative of possible repeatibility control applications. The term "repeatibility control" or "repeatibility testing" is here employed to describe any application in which the repeatibility of performance of color processing apparatus over time and/or over changing environmental conditions is of interest.

A number of applications of the method of computing a color calibration function, preferably in conjunction with the method of providing a database, both methods as shown and described hereinabove, will be described in detail herein, however, they are intended to be merely illustrative of the range of possible applications.

It is appreciated that only one or a few embodiments of each of the applications disclosed is described in detail hereinbelow, and that the details of implementation described herein are merely illustrative and by way of example, and that the embodiments described herein may be modified in any suitablemanner. For example, any of the applications herein may be implemented on any suitable computer, such as an IBM PC, by performing the required transformation on the digital output file of any ECSS. Measurements of the database may be carried out automatically, as disclosed herein, or manually, using any suitable equipment such as a spectrum analyzer. The measured data may then be input into the computer either automatically or manually.

<u>Application #1: Calibration of a first color scanner with reference to a second color scanner</u>

Reference is now made to Figs. 1A and 1B which illustrate respectively the generation of a calibration transformation and its employment in the incorporation of a new digital electronic color separation scanner into an existing reproduction system employing automatic calibration in accordance with a preferred embodiment of the present invention.

Conventionally, an existing reproduction work shop that purchases a new electronic color separation scanner (CSS) already owns one or more CSSs. During years of work and interaction with their customers, the shop has developed its own unique tone and color reproduction parameters that characterize the reproductions they produce. The tone and color reproduction parameters may depend on at least the following factors:

The type of originals employed, i.e. the brand and type of transparency or reflective copy;

The color separation scanner employed and its calibration;

The plotting system employed;

The printing system employed; and

Aesthetic considerations.

The introduction of a new ECSS normally changes the tone and color reproduction parameters that are realized. A long and tedious process of adjustment of the new ECSS is normally required, involving numerous adjustments by trial and error. Normally the tone and color reproduction parameters existing prior to introduction of the new ECSS are never fully realized.

In accordance with the present invention, the trial and error techniques currently in use are replaced by a fully- or, if desired, semi-automated well-defined and generally algorithmic technique.

In accordance with a preferred embodiment of the present invention, as illustrated in Fig. 1A, there is provided a substrate, such as a transparency, bearing an analog representation of a colored image 110 which typically comprises a plurality of colored locations 112. Preferably, the colored image will comprise a "good" database constructed in accordance with the database provision method shown and described hereinabove. Here a "good" database is one which, once scanned by the scanner 114 of Fig. 1A, has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space. Therefore, when constructing the colored image 110 in accordance with the database provision method of Fig. 7, the scanner 114 should preferably be used to scan the colored image 52. Alternatively, scanner 116 can be used.

The colored image 110 is scanned both by an existing ECSS 114 which it is sought to emulate and by the new digital ECSS 116. From the existing ECSS 114 a digital representation 118, comprising color values (preferably CMYK values) each corresponding to an individual one of the locations 112, is obtained. These values relate to the amounts of each colorant to be provided by a printing machine.

From the DECSS 116, a digital representation 120 of the locations 112, comprising color values (preferably RGB values) corresponding to each location 112 is provided. These values correspond to the color separations.

It is appreciated that references to RGB values and CMYK values, etc. throughout the present specification are intended to be examples of suitable color coordinates which can be replaced by any other suitable color coordinates, such as XYZ coordinates. Furthermore, there need not be exactly three input dimensions, or exactly three or four output dimensions. Any suitable number of dimensions may be employed.

Function construction means 122 receives pluralities of corresponding color values 118 and 120. Function construction means 122 is constructed and operative to compute a color calibration function from the color values 120 to the color values 118 in accordance with the color calibration function computation procedure shown and described hereinabove. The color calibration function computed by function construction means 122 is received by LUT construction means 124. LUT construction means 124 is operative to construct a LUT 126 relating the colorant values 118 to the RGB values 120 and to store the LUT 126, such as in the TCR module of the scanner 116. Software implementations of function construction and "on the fly" LUT construction are disclosed in Appendices A and B.

It is appreciated that function construction means and LUT construction means referred to throughout the present specification may be formed as a single unit, e.g. as a computer program which, for each point, computes the function at each point and then stores the point in a LUT "on the fly" before continuing to the next point.

As a result of the foregoing technique, an input of any particular input material to the DECSS will produce DECSS outputs with substantially identical CMYK values as those produced on the existing ECSS from the same input material.

Figure 1B illustrates the reproduction of input material using the existing ECSS 114 as opposed to the calibrated DECSS 116. The DECSS 116 scans the input 128, resulting in a first digital representation 130 thereof, which is then converted by the LUT 126 into a second digital representation 132 thereof, representing the required amounts of each colorant. It is seen that the digital representation 134 of the image 128 resulting from scanning by the ECSS 114 will normally be substantially identical to the output 132, as scanned by the DECSS 116.

Color values of the first digital representation which do not appear in the LUT 126 may be interpolated therefrom, using standard methods, such as those disclosed in chapter 2 of J. Stoer, Introduction to Numerical Analysis, Springer-Verlag, New York, 1980.

It is appreciated that the same or similar interpolation methods may be used in all of the applications of the present invention shown and described subsequently. The interpolation methods are preferably carried out automatically by suitable hardware, such as that commercially available from Zoran Corporation, Santa Clara, CA, USA, or from INMOS Limited, Bristol, UK.

In accordance with the embodiment of Fig. 1A, the ECSS 114 output of color values 118, corresponding to the color patches 112, can be stored as a digital file and can be transmitted to function construction means 122 by any suitable technique, such as via a cable connection, or by employing magnetic tape or other medium.

The above-described technique is not limited to automatic reading of colorant values. These values may be manually read one by one from the scanner. The operator may then input into the function construction means 122, as via a keyboard or via any other suitable input means, a list of RGB values and corresponding colorant values. A suitable software program may then be activated that will create the color calibration function and a look up table (if desired). The LUT may be stored in the memory of the DECSS.

Application #2: Output To Output Calibration

Reference is now made to Fig. 2A which is a schematic illustration of calibration procedures for producing a first printing system output substantially identical to the output from a second printing system.

The embodiment of Fig. 2A is particularly useful in calibrating a proofing machine, used to prepare a single copy of a reproduction for preliminary proofing purposes, to emulate a printing machine which it is intended to use to produce the final reproduction. The state of the art technology, such as the Cromalin (registered trademark) system available from DuPont (U.K) Limited, Hertfordshire, UK, produces a reproduction which may differ substantially from the output of the printing machine that the proofing system is intended to emulate. Consequently, the proof must be evaluated by an expert who can judge the quality thereof while attempting to mentally adjust for the expected discrepancies between proof and eventual printed reproduction. The present invention enables the proofing machine to be accurately and algorithmically calibrated so as to emulate the printing machine.

Since there may exist colors that can be printed by the final printing machine but cannot be printed by the proofing machine using any combination of colorants, it is desirable to choose a proofing machine that is compatible with the printing machine. For example, the Cromalin (registered trade mark) proofing system available from DuPont is generally compatible with offset printing machines. Otherwise, "unprintable" colors may be dealt with using any suitable technique, such as the techniques described in the above-referenced article by Stone et al (particularly pages 275-279 thereof), the disclosure of which is incorporated herein by reference.

A further application is when a printing machine needs to be replaced or when it is desired to add an additional printing machine to an existing workshop. Since the new machine may be of a different brand, type or model than the old machine, it is typically found that printing with the same colorant values on the new machine will produce a color with a different appearance. Therefore, it is generally the case that the new printing machine must be adjusted manually, by a trial and error process, until the reproductions obtained therefrom roughly resemble the reproductions obtained from the existing machine. It is typically impossible to obtain complete concordance between the appearances of the reproductions produced by the first and second machines.

The different appearances obtained from different printing or proofing machines may be the result of at least the following reasons: different colorant materials employed, different technologies employed (offset, gravure, web, Cromalin (registered trade-mark), ink-jet, heat transfer, etc.), dot shape of half-tone film or plates, room temperature, humidity, etc.

Comparison of the results from the respective printing devices is preferably carried out in a CIE (Commission International d'Eclairage) standard color space but may also be carried out in any other suitable color space.

A preferred procedure for using a graphic arts reproduction system comprising a first printing device as a reference in order to calibrate a graphic arts reproduction system comprising a second printing device is the following, described with reference to Fig. 2A:

a. Provide a first database 210 and a second database 212 for the first and second printing devices 214 and 216 respectively. The two databases comprise first and second pluralities of colorant values, preferably CMYK values. Preferably, databases 210 and 212 are "good" databases for sampling the operations of output devices 214 and 216 respectively, in the sense that, once printed by printers 214 and 216 respectively and scanned by the scanner 222, each database has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space.

The two databases are constructed in accordance with the database provision method shown and described hereinabove. When constructing database 210, using the database provision method of Fig. 7, the printer 214 should be used. When constructing database 212, the printer 216 should be used.

Preferably, the pluralities of colorant values 210 and 212 include only colorant values that are actually used in reproduction tasks, by printers 214 and 216 respectively.

b. Databases 210 and 212 are printed by printing devices 214 and 216 respectively. The resulting images 218 and 220 respectively are scanned by a color reading device 222 such as the Smart Scanner available from Scitex. The digital representations of images 218 and 220 respectively resulting from the scanning thereof are referenced as 224 and 226. Digital representations 224 and 226 each comprise a plurality of color values, such as RGB values. In some applications it may be desirable to convert the pluralities of RGB values 224 and 226 to corresponding pluralities of CIE XYZ values or values from another suitable coordinate system, using known techniques.

c. Function construction means 228 receives pluralities of corresponding color values 212 and 226 and constructs a color calibration function $f_1$ from 226 to 212. Function construction means 228 is constructed and operative in accordance with the color calibration function computation procedure shown and described hereinabove. The color calibration function $f_1$ computed by function construction means 228 is stored in storage means 230 and represents the amounts of cyan, magenta, yellow and black inks required to print, using printing device 216, a color to be read as a given RGB value by color reading device 222. Implementations of function construction means 228 and of the storage of the resultant function $f_1$ as a LUT are disclosed in Appendices A and B.

d. Function $f_1$ is operated on the $RGB_2$ values of representation 224, resulting in a plurality 232 of CMYK values. For each CMYK value of database 212, the corresponding C'M'Y'K' value in digital representation 232 represents the amounts of the colorants required to produce, by means of printer 216, a colored location which would be read by color reading device 222 as a value substantially equal to the corresponding RGB value in digital representation 224.

e. Function construction means 228 is also operative to receive pluralites of color values 210 and 232 and to compute a color calibration function from the color values 210 to the color values 232. The color calibration function from digital file 210 to digital file 232 is received by LUT construction means 234 and used to construct and store a LUT 236.

LUT 236 therefore represents the conversions of the amounts of cyan, magenta, yellow and black inks required to print using printing device 216, such that the output will appear to the color reading device 222 to be substantially identical to the RGB values read from the unconverted values of c, m, y and k printed by printing device 214.

According to a preferred embodiment, steps (c) through (e) may be performed twice, once exactly as above and once wherein digital representations 210 and 224 replace digital representations 212 and 226 respectively in step (c) and digital representation 226 replaces digital representation 224 in step (d). The resulting plurality of CMYK values will have twice as many values as it did in the previous embodiment, thereby enhancing the accuracy of LUT 236.

According to a first preferred embodiment, when scanning image representations 218 and 220, the white point is selected to be as close as possible to the white-point CMY values of the corresponding printers 214 and 216 respectively. If the selected white point cannot coincide exactly with the corresponding white-point CMY value, a slightly higher white point is typically selected. All other controls are put on their default setting.

According to an alternative preferred embodiment, the white-point is taken on a blank portion of the white paper or background. All other controls are put on their default setting.

It is appreciated that the most appropriate selection of the white point may vary as a function of the particular application and of the particular graphic arts reproduction system employed.

Preferably, colored image representations 218 and 220 are each automatically scanned, thereby to define a plurality of color values corresponding to a plurality of colored locations into which each image is divided. Any suitable procedure may be employed to accomplish this, which procedure may comprise the steps of: automatically passing from pixel to pixel of the colored image while reading and storing the color values of each pixel, defining a plurality of colored locations each comprising a plurality of pixels, and averaging or otherwise combining the values of at least some of the pixels in each colored location, thereby to define a color value for each colored location. A software implementation of a procedure for automatically scanning an analog representation of a colored image is disclosed in Appendix B.

Once constructed, LUT 236 may be utilized in at least two different ways:

(i) If it is desired to print, on printer 216, an image represented as a digital file originally intended for printing by printer 214 so that its appearance to the color reading device 222 will be substantially as when the digital file is printed on printer 214, the digital file is passed through LUT 236 and the resulting transformed digital file is printed on printer 216. The results of printing the digital file on printer 214 and subsequently reading it using color reading device 222 are substantially identical to the results that would be obtained by printing the transformed file on printer 216 and subsequently reading it using color reading device.

(ii) Reference is made to Fig. 2B which illustrates modification of an RGB-to-CMYK LUT 260 incorporated in a color reading device 223 such as a scanner. LUT 260 is suitable for use in conjunction with printing device 214. It is desired to modify LUT 260 and thereby to obtain a modified RGB-to-CMYK LUT 262 which, when loaded onto scanner 223 and used in conjunction with printing device 216 will result in pictures substantially identical to those produced by scanner 223 loaded with LUT 260 and printing device 214, where the term "substantially identical" implies that pictures produced by the two processes will be "seen" as substantially identical by a scanner.

As shown in Fig. 2B, LUT 236 is operated on the values of LUT 260, transforming each CMYK value intended for printer 214 to a CMYK value suitable for printer 216, thereby to obtain LUT 262. Consequently, the result 264 of scanning a particular image 265 using scanner 222 loaded with LUT 260 and subsequently printing with printer 214 are substantially the same as the result 266 of scanning the image using scanner 222 loaded with LUT 262 and subsequently printing with printer 216. This implies that a scanned representation of picture 264 will comprise generally the same values as a scanned representation, using the same scanner, of picture 266.

Reference is now made to Fig. 8 which illustrates an alternative embodiment of the output to output calibration.

A digital representation 710 of an image, typically in the CMY color coordinate system but alternatively, in any N-dimensional color coordinate system, is sought to be produced by at least two color reproduction systems, typically a proofer 712 and a printer 714, such that digital representations 720 and 722 of analog representations 716 and 718, respectively, are generally identical. Digital representation 710 is analogous to databases 210 and 212 of Fig. 2A and digital representations 720 and 722 are analogous to digital representations 224 and 226 of Fig. 2A.

Digital representations 720 and 722 are typically produced by a colorimeter or other color measuring system, and are typically in a colorimetric color coordinate system, such as XYZ or L*a*b*, or any other measurable N-dimensional color coordinate system. Typically, the three dimensions are the CIE defined coordinate system, such as XYZ or L*a*b*, and the remaining dimensions are any which may be desired to be measured, such as non-colorimetric effects seen by a human observer. One such dimension P might be the shininess of each color, or P might be derived from CMYK values using a formula such as:

$$P = K - (C+M+Y)/3 \quad (1)$$

Formula 1 gives an indication of the amount of black used to produce a given color.

Figs. 8 - 11 illustrating this embodiment indicate that the digital representations are in the CMY and XYZ color coordinate systems. It will be appreciated that the present invention is operative for N-dimensional transformations and that the notation CMY and XYZ is by way of explanation only.

It is known in the art that the two reproduction systems, when input an identical digital representation 710, will generally produce somewhat different analog representations 716 and 718. Since it is generally desired to match the output of one color reproduction system, defined here as the proofer 712, to the output of the other reproduction system, defined here as the printer 714, a color transformation 724 between the CMY color coordinate system of the digital representation 710 to the CMY color coordinate system of the proofer 712 is necessary.

The color transformation 724 typically takes as input an N-dimensional transformation lookup table 742 relating the printable coordinate system of the input digital representation 710 with the printable coordinate system of the proofer 712.

Transformation lookup table 742 can be produced according to the function construction method described hereinabove or, alternatively, in accordance with an alternative function construction method as described hereinbelow with respect to Figs. 9 - 11.

Reference is now made to Fig. 9 which illustrates apparatus for performing the alternative method. An N-dimensional color conversion table 730 is built for the printer 714 which converts between a first input digital representation, typically in CMY, CMYK or any N-dimensional printable color coordinate system, and digital representation 722 of the output analog representation 718, in a measurable color coordinate system, such as XYZ or XYZP. Typically but not necessarily, the number of input dimensions is equivalent to the number of output dimensions. Typically the first input digital representation comprises a "good" database, as described hereinabove.

The conversion table 730 is built as follows: the first input digital representation is sent to printer 714 to be printed. The resultant analog representation 718 is measured, via colorimeters or other measurement devices, and the color value of each printed color is stored in conversion table 730 opposite the input digital value which produced it. The precise details of the production of table 730 are given in the manual for the TRANS/4 color converter, manufactured by Scitex Corporation Ltd. of Herzliya, Israel, incorporated herein by reference and set forth in Appendix E. Alternatively, the conversion table 730 can be produced according to the function construction method described hereinabove.

The first input digital representation typically is organized on a N-dimensional grid.

In accordance with the present invention, an N-dimensional conversion table 732 is built for proofer 712 which converts between a second input digital representation, which can be different from the first input digital representation and typically is in a CMY or CMYK or any N-dimensional printable color coordinate system, and a digital representation of an output analog representation produced without the color transformation 724, in a measurable color coordinate system, such as XYZ. The conversion table 732 is built as described hereinabove for conversion table 730. The conversion table 732 is not necessarily built using the same grid as that of table 730. It can be built from any grid or from no grid. Its CMY values can be different from the CMY values used to produce conversion table 30 or they can be identical. Typically but not necessarily, the number of input dimensions is equivalent to the number of output dimensions.

Conversion tables 730 and 732 are input into a printer-to-proofer transformer 734, described in more detail hereinbelow with reference to Fig. 10, for transforming a plurality of printer CMY values to a plurality of proofer CMY values where the XYZ values of the proofer CMY values are generally close to the XYZ values of the printer CMY values. An XYZ value of a CMY value is defined as the XYZ measured from the color produced by the color reproduction system when the CMY value is input to it.

It will be appreciated that the output proofer CMY value does not necessarily appear in conversion table 732.

Printer-to-proofer transformer 734 can be utilized for producing a transformation table 736 of proofer CMY values for each of the printer CMY values of conversion table 730, or, alternatively as shown by a dotted arrow, for producing a proofer CMY value upon input of a printer CMY value. Transformation table 736 is on the same grid as conversion table 730.

Transformation table 736 can optionally be stored in a color converter 744, such as the TRANS/4 color converter, for converting a printer CMY value to a proofer CMY value in accordance with table 736. For any printer CMY value not found in table 736, a linear interpolation is performed on table 736 in order to produce the output proofer CMY value.

Alternatively, the transformation table 736 can be input to an optional editor 738 for editing table 736. Editor 738 can be any kind of editor or text processor and is operative to allow an operator to manually correct the table 736, if necessary.

For example, in a CMY color coordinate system using a 'percent (%) dot' scale indicating the percentage of each ink to be used to produce the color, white is denoted by (0,0,0). When the white of the printer 714 is darker than the white of proofer 712, transformer 734 typically produces a proofer CMY white value greater than (0,0,0). This typically produces undesired effects such as the existence of screen dots in the analog output of the proofer 712 where none exist in the analog output of the printer 714.

The above undesired effects can be eliminated by editing table 736, via editor 738, to put a (0,0,0) proofer CMY value for a (0,0,0) printer CMY value. However, it will be appreciated that this produces an incorrect colorimetric (XYZ) value for the white produced by proofer 712.

The output of optional editor 738, an edited table 736, or, in the absence of editor 738, a non-edited table 736, is input to a non-linear interpolator 740 for non-linearly interpolating table 736 thereby to produce transformation table 742 which is denser than transformation table 736. The operation of interpolator 740 is described in more detail hereinbelow with reference to Fig. 11.

Transformation table 742 is an N-dimensional CMY-CMY lookup table which is then stored in color converter 744. For any printer CMY value not found in table 736, a linear interpolation is performed on table 742 in order to produce the output proofer CMY value. It will be appreciated that the linearly interpolated value produced from table 742 is generally more accurate than the linearly interpolated value produced from table 736 since table 742 is denser than table 736.

It will be appreciated that, alternatively, color converter 744 can perform a non-linear interpolation from table 736. The present invention does not illustrate this alternative since cost and speed considerations using current computer technology indicate that the above method is presently more desirable.

Transformation table 742 can be used, as is, or it can be made more accurate as follows:

1) Color transformation apparatus 724 utilizes transformation table 742 on the CMY data listed in table 732 to print analog representation 716 whose colorimetric values are subsequently measured.

2) A new conversion table is produced which is then concatenated to conversion table 732 to produce a new version of conversion table 732.

3) The method of Figs. 9 - 11 is repeated, using the new version of conversion table 732.

Steps 1 - 3 can be repeated any number of times to produce an accurate transformation table 742.

Reference is now made to Fig. 10 which details, in flow chart format, the operation of printer-to-proofer transformer 734.

For each entry in the printer conversion table 730, the operation involves searching the proofer conversion table 732 for entries whose XYZ value is near, by some definition, to the printer XYZ value. The results are stored in a table of close values. This is shown in steps 750 - 764 of Fig. 10.

Specifically, step 754 requires the initialization of the table of close values. This may take the form of defining a closeness threshold less than which indicates closeness, or it may take the form of a maximum number of close values allowed.

In the second case, as the proofer table 732 is searched, the closest values found, and their distances, are stored. If a closer one is found, the furthest of the stored values is released and the closer one kept. Thus, in step 754, the distances for the initial close values are set to high numbers.

In step 758, the distance between the printer XYZ value and the present proofer XYZ value is calculated, typically as the Euclidean distance. Other suitable distance measures can alternatively be used.

Typically, combinations of the close proofer values found in step 762 are then utilized for the next set of calculations. Combinations must minimally be of one more than the dimension size of the input digital representations. Thus, if the digital representations are in CMY, then there will minimally be four proofer values in each combination. The number of elements in the combination can be predetermined by the operator.

The distance between the printer XYZ value and the combination of proofer XYZ values is calculated as a combination of two elements. The first is the sum of the distances between the individual proofer XYZ values and the printer XYZ value.

The second is an "insideness" measure defining whether or not the printer XYZ value falls within the constellation of proofer XYZ values and can be calculated in a number of ways. For example, a set of linear equations can be solved where equations 2 - 5 below are an exemplary set for use with a combination containing four proofer points:

$$P_x = F_{x1}m_1 + F_{x2}m_2 + F_{x3}m_3 + F_{x4}m_4 \quad (2)$$

$$P_y = F_{y1}m_1 + F_{y2}m_2 + F_{y3}m_3 + F_{y4}m_4 \quad (3)$$

$$P_z = F_{z1}m_1 + F_{z2}m_2 + F_{z3}m_3 + F_{z4}m_4 \quad (4)$$

$$1.0 = m_1 + m_2 + m_3 + m_4 \quad (5)$$

where the $m_i$ are unknown values, $P_j$ indicates the printer X, Y or Z values and $F_j$ indicates the proofer X, Y or Z values.

If the printer XYZ value falls inside the proofer XYZ values, indicated by all positive $m_i$, the insideness measure is given a small positive value. Otherwise, the insideness measure is defined as the absolute value of the sum of the negative $m_i$.

The distance between the printer XYZ value and the proofer XYZ values is defined as the combination of the insideness measure and the distance sum, where the combination is typically by multiplication but can be by any other suitable operation.

For all proofer XYZ combinations close to the printer XYZ, the steps 772 - 776 are performed.

Weights are calculated such that the weighted vector sum of the proofer XYZ combination is the printer XYZ. In other words, the printer XYZ is at the 'center of mass' of the proofer XYZ combination. This is calculated in step 772 and involves the solution of a linear set of equations, such as equations 2 - 5.

A preliminary proofer CMY value is then calculated in step 774. Specifically, a weighted vector addition of the proofer CMY values of this combination, found in table 732, is performed using the weights calculated in step 772.

In step 776, the preliminary proofer CMY value of step 774 is assigned a weight which is a function of the distance of the combination to the printer XYZ value as calculated in step 768. Typically, the weight assigned is the distance between the combination and the printer XYZ value divided by the sum of these distances over all combinations close to the printer XYZ value.

The output proofer CMY value which produces a generally identical XYZ value as the printer XYZ value is calculated in step 780 as the weighted sum of all the preliminary proofer CMY values where the weights are those assigned in step 776.

It will be appreciated that alternatively, it is possible to select only the closest proofer combination, calculate its CMY value and use that value as the output proofer CMY value.

Table 736 is a lookup table with the printer CMY value vs. the output proofer CMY value calculated in step 780.

Reference is now made to Fig. 11 which details the non-linear interpolation method of interpolator 740.

A non-linear function, such as a tensor of splines, which defines the relationship between printer CMY values and proofer CMY values is fit to optionally edited conversion table 736 in step 794. Tensors of splines are described in detail in chapter 17 of A Practical Guide to Splines, by Carl De Boor, Vol.

27 of the Applied Mathematical Sciences series published by Springer Verlag, New York, 1978, which is incorporated herein by reference. A further reference is An Introduction to Splines for use in Computer Graphics and Geometric Modeling, by Richard H. Bartels et al., published by Morgan Kaufmann Publishers, Inc., Los Altos, California, 1987.

Once the number and placement of printer CMY values in transformation table 742 are defined, typically via the operator and typically on a grid used by color converter 744, the non-linear function is used to calculate the proofer CMY value for each printer CMY value in table 742. In this manner, table 742 is produced.

Object code for implementing the operations of transformer 734 and interpolator 740, shown in the flow charts of Figs. 10 and 11, are set forth in Appendices F and G, respectively. Exemplary source code indicating how to interface with the object codes of Appendices F and G is set forth in Appendix H along with instructions as to how to use the source code.

Reference is now made to Fig. 12 which illustrates an integrated system for reading and writing an image, suitable for performing the output to output calibration procedures of Figs. 2A, 2B and 8 - 11. Thus, the system is capable of producing the conversion tables 736 and/or 742 of Fig. 9 and LUTs 236, 260 and 262 of Figs. 2A and 2B.

The system comprises a color proofer 800, for writing an analog representation of an image from a digital representation and a color reading system 802, such as a colorimeter or a spectrophotometer, for creating a digital representation of an image from an analog representation. The color reading system 802 is typically directly connected to the color reproduction system 800. A digital data processor 830 controls the operations of both the color proofer 800 and the color reading system 802.

As is known in the art, color proofer 800 typically comprises a translation system comprising a drum 804 for rotating a substrate 805, such as a piece of paper, upon which will be printed the analog representation of the image, and a translating carriage 807 which moves in one direction as the drum 804 rotates. Onto the translating carriage 807 are attached nozzles 806 for receiving inks in accordance with the digital representation of the image and for effecting the printing of the analog representation of the image onto the substrate 805. A controller 808 simultaneously controls nozzles 806 and the movement of drum 804 and translating carriage 807 in accordance with the digital representation of the image received from data processor 830. Controller 808 also reports information regarding the status of proofer 800 to processor 830.

Any suitable color proofer 800 can be used. An example of which is the Iris color proofer, model 3024, manufactured by Iris Graphics Inc. of Massachusetts, USA.

As is known in the art, color reading system 802 typically comprises a reading head 820, such as a spectrophotometric head, for reading the colors of an analog representation and for producing from them a digital representation of the analog representation and a color reading processor 822 for controlling the operation of the reading head 820 and for receiving its output. Reading head 820 typically comprises a light source and a light detector coupled via an optical system. The elements of the reading head 820 are not shown since they are known in the art. Processor 822 is digitally connected to processor 830 from which it receives instructions and to whom it provides data.

Any suitable color reading system 802 may be used. An example color reading system is the Gretag SPM-700 manufactured by Gretag Ltd. of Regensdorf, Switzerland.

In accordance with the present invention, the reading head 820 is fixed to the translating carriage 807 of the color proofer 800. This physical connection 803 is noted in Fig. 12 by a curved line. The analog representation to be read is placed on drum 804 and reading is effected during the simultaneous rotation of the drum 804 and translation of carriage 807. Preferably, during the reading operation, nozzle 806 is not activated and thus, no writing is performed.

It will be appreciated that the placement of the reading head 820 onto the translating carriage 807 enables reading and writing to be performed in one machine.

Data processor 830 typically comprises a processor 832 for receiving data from color reading system 802 and for transmitting instructions to controller 808 and a processing unit 834 for controlling processor 832. Processing unit 834 is operative to match the output of a second color reproduction system to the output of color proofer 800 as described hereinabove with reference to Figs. 2A, 2B and 8 - 11 and to this end, it controls which operation, the reading or the writing operation, will occur at a given moment.

Processor 832 is typically the processor provided with the color proofer 800, such as the processor provided with the Iris color proofer model 3024 and processing unit 834 is typically a workstation, such as the Whisper workstation manufactured by Scitex Corporation Ltd. of Herzliya, Israel.

The operation of the system of Fig. 12 will now be described with reference to the operations of Figs. 8 - 11, it being understood that the system of Fig. 12 is operative also to perform the operations of Figs. 2A and 2B. Similar reference numerals are used to refer to similar elements:

1) Analog representation 718 from the second color reproduction system (i.e. printer 714) is placed on drum 804 and its color values are read by reading head 820, thereby producing digital representation 722 which is stored in processing unit 834.

2) Analog representation 716 is produced by color proofer 800 using digital representation 710, the representation used to produce analog representation 718.

3) Analog representation 716 remains on drum 804 and its color values are read by reading head 820, thereby producing digital representation 720.

4) Processing unit 834 first produces color conversion tables 730 and 732 from representations 716, 718, 720 and 722 and from them produces the transformation table 742.

Application #3: Duplication of Originals

Reference is now made to the schematic illustrations of Figs. 3A and 3B, which illustrate an embodiment of the invention useful in producing duplications of images existing as hard copies on a particular medium (such as but not limited to a transparency or reflective copy). It is noted that a half-toned printed picture can be duplicated entirely analogously to what will be described herein, except that the picture may be de-screened, using conventional techniques (such as those described in Marquet, M., "Dehalftoning of negatives by optical filtering,", Optica Acta 6, 404-405, 1959; Marquet, M. and J. Tsujiuchi, "Interpretation of Particular Aspects of Dehalftoned Images," Optica Acta 8, 267-277, 1961; and Kermisch, D. and P.G. Roetling, "Fourier Spectra of Halftone Screens", J. Opt. Soc. Amer. 65, 716-723, 1975, the disclosure of which is incorporated herein by reference).

A preferred method for providing for duplication of images represented on a given medium is as follows. Steps (a)-(d) are illustrated in Fig. 3A. Step (e) comprises two alternative methods for duplicating a given image once steps (a) - (d) have been carried out, illustrated in Figs. 3B and 3C respectively.

a. Provide a first digital representation 310 of a colored image, typically comprising a first plurality of RGBvalues, using the database provision method shown and described hereinabove. Here a "good" database 310 is one which is suitable for sampling the operation of recorder 312 used in conjunction with recording medium 314 and scanner 316, as explained hereinabove in the section on database construction, and is preferably constructed in accordance with the method of Figs. 7A-7B. Therefore, when using the database provision method of Fig. 7A-7B to construct the database 310, the scanner 316 and the recorder 312 should be used for scanning and recording the initial database.

b. Place a substrate 314 of the desired medium in a color recorder 312 such as a 4cast available from DuPont. According to a preferred embodiment of the present invention, the medium of the substrate 314 is the same as the medium of the original 326 (Fig. 3B) which it is desired to duplicate. Load the color recording apparatus 312 with the digital file 310, thereby to provide an analog representation 315 corresponding to the digital representation 310 of the colored image.

c. Read the analog representation 315 using a color reading device 316 such as an analog ECSS or a DECSS, thereby to obtain a second digital representation 318 of the colored image, preferably comprising a second plurality of RGB values corresponding to the plurality 310 of RGB values.

d. Input digital representations 310 and 318 to function construction means 320, which is operative to construct a function from the plurality of color values 318 to the plurality of color values 310 in accordance with the color calibration function computation procedure described hereinabove. The color calibration function computed by function construction means 320 is received by LUT construction means 322. LUT construction means 322 is operative to construct a LUT 324 relating the RGB values 318 to the RGB values 310 and to store the LUT 324 in the TCR module of the scanner 316. The LUT 324 may now be used as follows:

e. Reference is made to Fig. 3B. Given a substrate 326 (preferably of the same medium as substrate 314) bearing an analog representation of a colored image 327, and when it is sought to duplicate the colored image 327 onto a second substrate 328 (preferably of the same medium as substrate 326), the image 327 is scanned by the scanner 316 whose TCR module contains the LUT 324, thereby to obtain a digital representation 330 of the colored image. The digital representation is then recorded by color recording apparatus 312, thereby to obtain a substantially accurate duplicate 332 of the original colored image 327 on substrate 328.

Alternatively, the colored image 327 may be reproduced as in Fig. 3C. As shown, the image 327 is scanned by the scanner 316 using only the color separation unit 334, thereby to define a digital representation 336, preferably comprising a plurality of RGB values, of image 327. The digital representation 336 is stored in storage means 338. The function constructed by function construction means 320 is stored in any suitable storage 340, such as the memory of a suitable computer, preferably in the form of a LUT. Function operation means 321 then operates the function on digital representation 336 which is read from storage means 338, thereby to provide a modified digital representation 330 of image 327. Digital representation 330 is then recorded by color recording apparatus 312, thereby to obtain a substantialy accurate duplicate 332 of the original colored image 327 on substrate 328.

If desired, certain of the above steps can be peformed manually. Specifically, the RGB color values of the patches 314 may be manually measured with a color separation scanner and then manually input into function construction means 320, as by a keyboard, instead of being scanned.

According to an alternative embodiment, the image 327 on the substrate 326 is scanned itself to provide digital representation 310 (Fig. 3A). This embodiment is particularly useful in certain applications as it employs precisely those colors required for the duplication of the particular image 327.

Application #4: Reconstruction of Input from Output

Reference is now made to Figs. 4A- 4E, which illustrate a further embodiment of the present invention useful in reconstructing a hard copy produced using a given tone and color reproduction system.

Figure 4A:
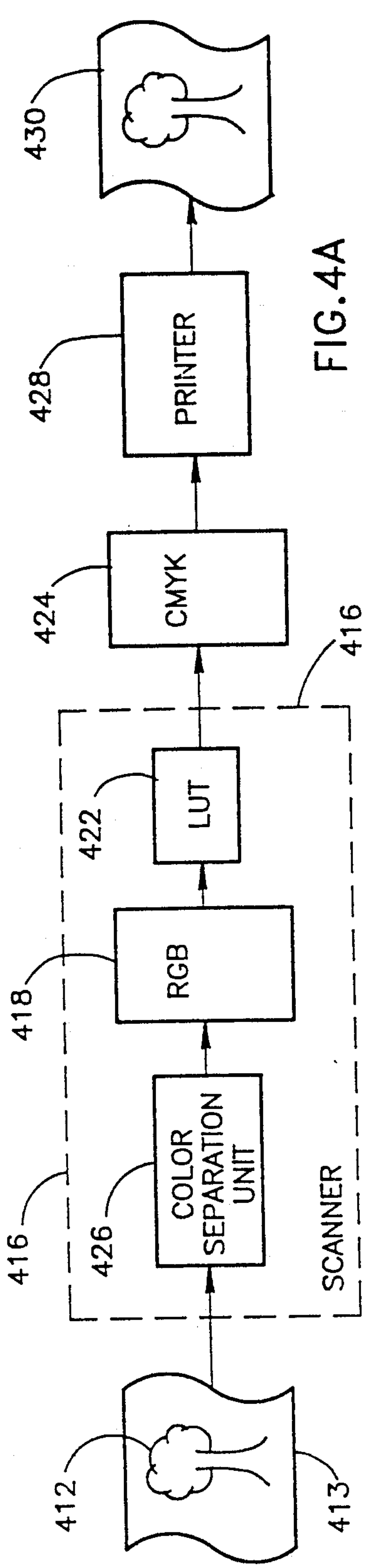

Fig. 4A describes a standard reproduction process of an image on a transparency 412 which is printed as a reflective copy 430. If the original transparency 412 is unavailable, it can be reconstructeed using either the processed digital file 424 or the reflective output 430.

Figure 4B:
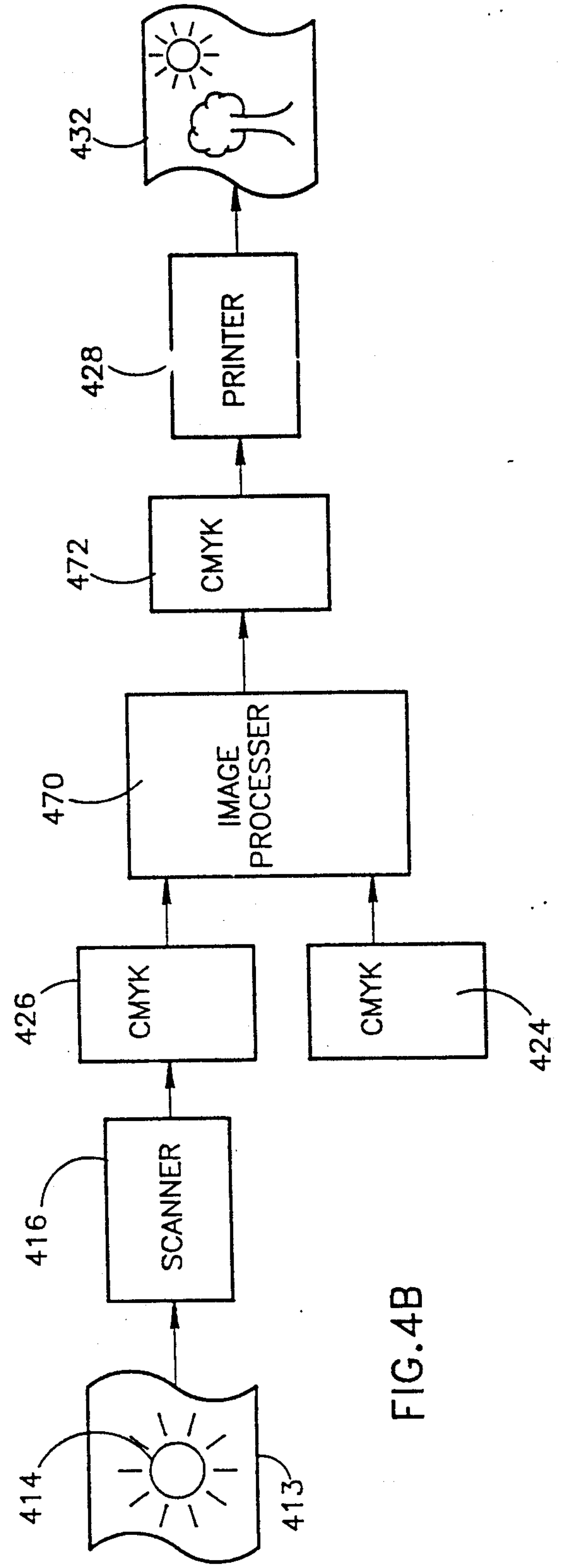

Fig. 4B describes an application in which it is desired to create a single image comprising the tree in picture 412 and the sun in picture 414, and to represent it upon a single substrate, thereby to obtain a single representation 432 (such as a reflective copy) of both the sun and the tree. It may be desired to provide transparencies of the representation of the combined image in which the tree resembles the tree in the original picture 412 and the sun resembles the sun in the original picture 414. Preferably, the medium of the original picture 412 is substantially identical to the medium of the original picture 414.

Figure 4C:
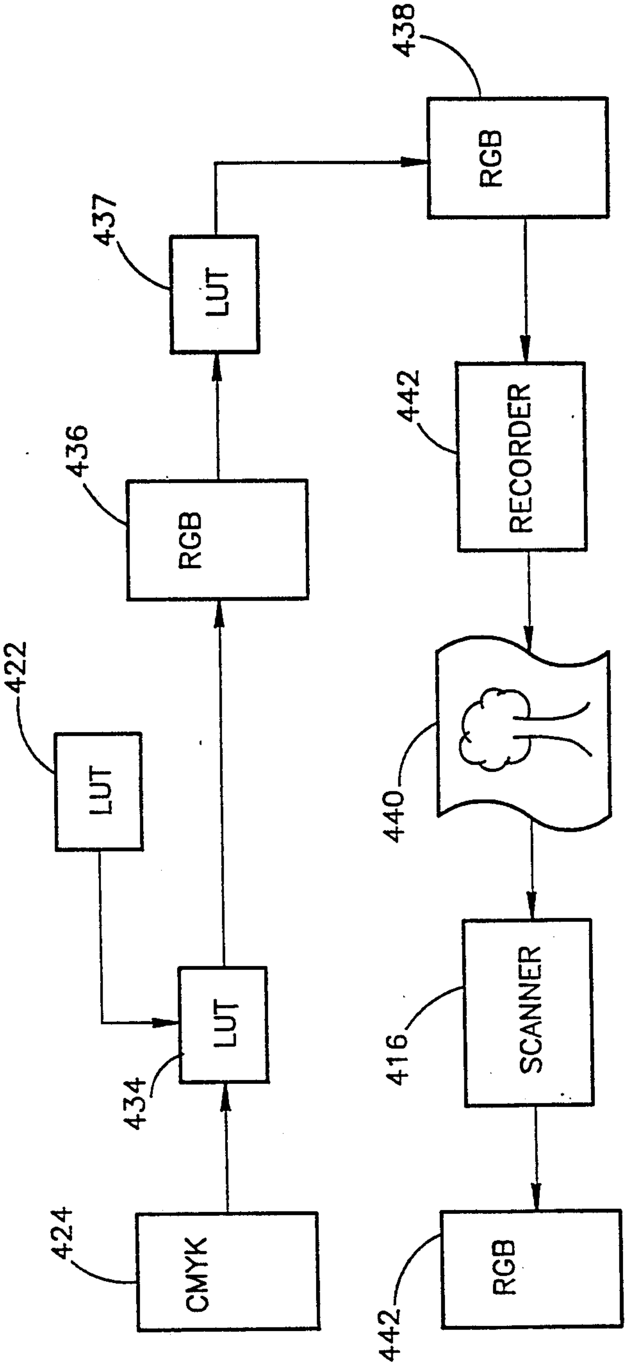

A preferred method of reconstructing the input copy 412 assuming that LUT 422 and digital file 424 are still available is illustrated in Fig. 4C. First, LUT 422 is inverted, using known methods such as those disclosed on page 267 of the above referenced article by Stone et al, thereby to provide an inverted LUT 434. LUT 434 is then operated on digital file 424, thereby to provide a digital file 436, typically comprising a plurality of RGB values, which values are substantially identical to the plurality of RGB values 418 scanned from the input copy 412 (Fig. 4A). The remainder of the procedure consists of constructing a LUT 437 which, when operated on digital file 436, will result in a digital file 438 which when recorded on a substrate 440 (preferably of the same medium as the original 412) by a recorder 442, will result in an analog representation which has the following property: If scanned by scanner 416, analog representation 440 will provide a digital representation 442 substantially identical to digital file 436 (and digital file 418). Preferably, the analog representation also has the property of appearing to the human eye to have substantially the same tone and color as the original 412.

A preferred method of constructing a LUT 437 with at least the former property and typically both properties has been shown and described hereinabove with reference to Fig. 3A, in which the LUT with the desired properties is referenced as LUT 324.

Figure 4D:
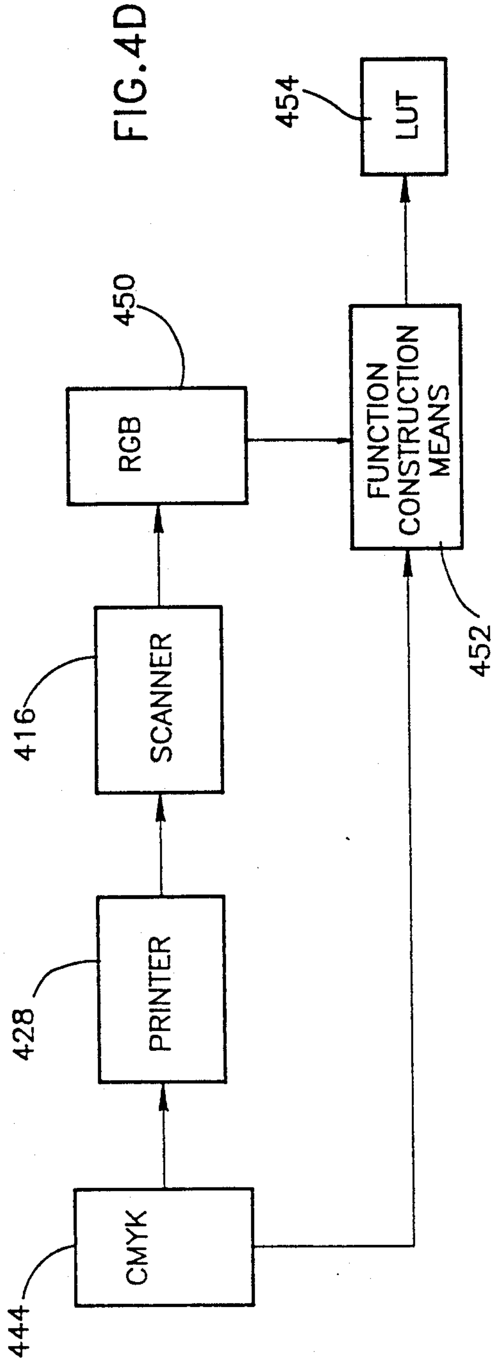
Figure 4E:
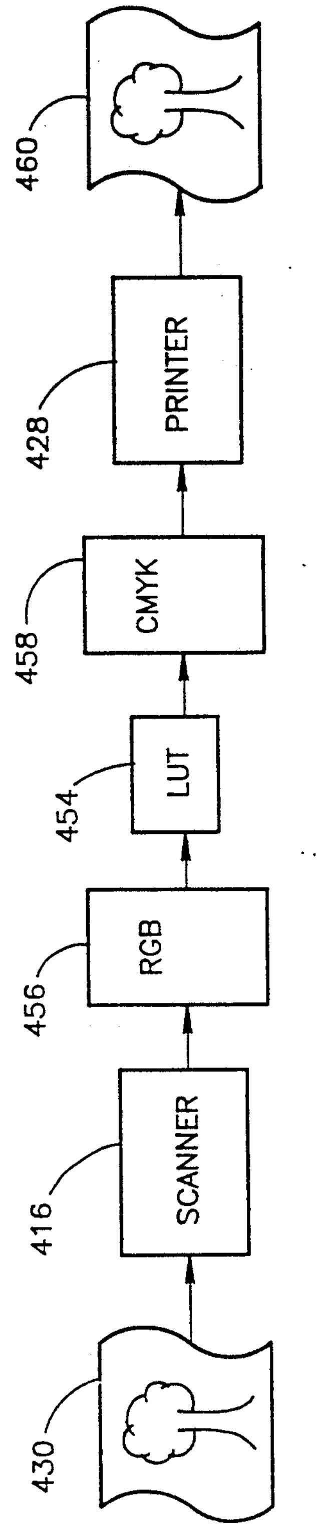

A preferred method of reconstructing the input copy 412 from the output copy 430 when digital file 424 is not available, whereas the printed picture 430 of fig. 4A is available, is illustrated in Figs. 4D and 4E. As shown, the method comprises providing a database 444, which is preferably a "good" database for sampling the operation of printer 428 in conjunction with scanner 416 and which typically comprises a plurality of CMYK values. The database 444 is printed (e.g. as a reflective copy) by printer 428 and is subsequently scanned by scanner 416, thereby to provide a digital file 450. Alternatively, digital file 450 may be predetermined and database 444 may be constructed therefrom using the database construction method shown and described hereinabove with reference to Figs. 7A-7B. Function construction means 452 receives corresponding pluralities of color values 450 and 444 and constructs a color calibration function from RGB values 450 to CMYK values 444 and preferably stores it in the form of a LUT 454, all in accordance with the function construction procedure shown and described hereinabove.

As shown in Fig. 4E, output copy 430 is scanned by scanner 416 and the resulting digital file 456, typically comprising RGB values, is passed through LUT 454, thereby to provide a digital file 458 preferably comprising a plurality of CMYK values. The plurality 458 of CMYK values, when output by printer 428, will result in a hard copy 460 of the original image which is substantially identical to the hard copy 430. The digital file 458 is substantially identical to digital file 424 of Fig. 4A. Therefore, digital file 458 may be employed to restore the original transparency 412 using the procedure of Fig. 4C.

The color recording apparatus 442 may comprise any suitable color recording apparatus, such as the 4cast plotter available from DuPont.

The computations described hereinabove need not be carried out by the scanner but may alternatively be carried out by any suitable computation means, typically a standard computer such as an IBM PC, which may communicate with the remainder of the apparatus using any suitable conventional communication method.

<u>Application #5: Calibration of a first color separation scanner with reference to a second color separation scanner on a special setting</u>

The following embodiment of the present invention is useful when it is desired to calibrate a scanner or other color reading device relative to a reference scanner/reading device on a special setting such as but not limited to GCR, UCR, UCA, etc. This embodiment is particularly useful if the operator is relatively unfamiliar with the special setting.

Reference is now made to Fig. 5A which illustrates an embodiment of the present invention useful in incorporating a new DECSS into an existing TCR system comprising a currently used ECSS (or DECSS) on a special setting.

It is appreciated that, by putting the currently used ECSS onto its special setting, a look up table can be constructed which will allow the new DECSS to emulate the existing TCR system, by using the method of Figs. 1A and 1B shown and described hereinabove. However, normally, an unmodified implementation of the look up table is undesirable since operators generally find it difficult to perceive and interpret the special setting CMYK values in the course of subsequent operator controlled tone and color adjustment. Therefore, it is preferable to initially scan the image with a scanner loaded with a "regular" LUT in order to enable the operator to carry out the desired tone and color modifications. Once the modifications have been completed, the modified color values may be converted to the special setting values, thereby to implement the calibration of the scanner to be calibrated with reference to the special setting of the reference scanner.

A preferred procedure for calibrating a first color scanner with reference to a second color scanner on a special setting comprises the following steps:

a. The existing scanner 510 is put onto its normal setting N and an analog representation 512 of a colored image comprising a plurality of colored locations 514 is scanned, thereby to obtain a digital representation 516 comprising a plurality of color values, typically CMYK values, corresponding to the plurality of colored locations 514.

The colored image 512 is preferably a "good" database constructed in accordance with the database provision method shown and described hereinabove. Here a "good" database 512 is one whose values are as close as desired to a "target" predetermined plurality of color values. For example, database 512 may comprise a database which is so constructed that it samples the operation of scanner 510 on its special setting in the subrange in which use of a special rather than normal setting makes a substantial difference. Construction of such a database is explained hereinabove in connection with the database construction method of Figs. 7A-7B.

b. The existing scanner 510 is put onto the desired special setting S and the same colored image is scanned, thereby to obtain a digital representation 518 comprising a plurality of color values, typically CMYK values, corresponding to the plurality of colored locations 514.

c. Digital representations 516 and 518 are input to function construction means 520, which is operative to construct a function from the plurality of color values 516 to the plurality of color values 518 in accordance with the color calibration function computation procedure shown and described hereinabove. The color calibration function computed by function construction means 520 is received by LUT construction means 522. LUT construction means 522 is operative to construct a LUT 524 relating the CMYK values 518 to the CMYK values 516 and to store the LUT 524 in the TCR module of the scanner 510. Implementations of means for constructing a function and storing it as a LUT " on the fly" are disclosed in Appendices A and B.

d. When it is desired to use the new DECSS 526 to scan an input copy 528, the input 528 is scanned with the scanner 526, thereby to obtain a digital representation 530 of the input 528. The RGB (typically) values of digital representation 530 are typically converted using the standard LUT 126 of Fig. 1A, resulting in a second digital representation 532 of input 528, preferably comprising a plurality of CMYK values which are "standard" in that they are familiar to a human operator accustomed to working on a normal setting and thus easily modifiable by the operator.

e. Desired tone and color manipulations may be carried out by a human operator, typically on LUT 126, resulting in modifications of digital representation 532 in subsequent versions thereof.

f. Once the operator has completed the step of manipulating tone and color, LUT 524 is employed to convert each of the normal setting CMYK values of the digital representation 532 to the corresponding special setting CMYK values, resulting in a final digital representation 536 of the input 528, which is substantially identical to the digital representation of input 528 which would result by scanning input 528 with scanner 510 on its special setting and performing the same operator-input tone and color manipulations.

Alternatively, as shown in Fig. 5B, following the execution of tone and color modifications by the operator, the CMYK values of LUT 126 may be converted, thereby to define a converted LUT 538, by using the conversion stored in LUT 524 or by operating the function constructed by function construction means 520 on LUT 126. LUT 538 may be stored in the TCR module of the scanner 526. Digital representation 530 may then be directly converted by LUT 538, preferably on the fly, to provide the final digital representation 536.

It is noted that here as throughout the present specification, the color calibration function whose construction is described hereinabove may be stored in the memory of any suitable commercially available computing means, such as the IBM PC.

<u>Application #6: Calibration of a color monitor display with reference to output apparatus</u>

Reference is now made to Fig. 6 which is a schematic illustration of a method for calibration of a CRT with reference to output apparatus. The objective is to provide an analog representation 610, on a CRT display 616, of a colored image, which representation resembles a hard copy representation 612 of the colored image output from a printing device 214. It may be appreciated that the present method and apparatus are generally similar to the method and apparatus of Fig. 2, where a printing device 216 (rather than a CRT) is calibrated with reference to output apparatus 214. Identical reference numerals are employed to reference identical elements in Figs. 2 and 6 to facilitate understanding of the similarity. The distinguishing elements of the method and apparatus of Fig. 6 will now be discussed.

As shown in Fig. 6, an optical interface 620 is required to enable scanner 222 to receive input from CRT 616. The particular interface required varies according to the scanner 222. For example, the Scitex Smart Scanner may be optically coupled to the screen of the monitor 616 by mechanically disconnecting and removing the color separation head of the scanner from the interior of the scanner while maintaining the electrical wiring connections and placing the head in front of the monitor. Also, the RGB values 210 are preferably displayed one after the other on the CRT screen 616 and are received one at a time by the scanner 222. Synchronization of the scanner with the monitor is required. This procedure is provided on the Smar Scanner available from Scitex.

As in Application #2, it may be desirable to convert pluralities of RGB values 224 and 226 to XYZ values or values from any other suitable coordinate system, using conventional apparatus and techniques, such as those described in P.G. Engeldrum, "Almost Color Mixture Functions", Journal of Imaging Technology, 14(4), August 1988, and in references 2 and 5-7 cited therein. The disclosures of this article and of all references cited therein are incorporated herein by reference. Also, it is appreciated that any suitable color reading device may replace the scanner 222.

If desired, RGB values 226 may be read in CMC form by optical interface 620. The filter arrangement of the normally used color separation head of the Smart Scanner may be replaced by a CMC filter arrangement which emulates the human eye. CMC filter arrangements and methods for constructing them are described in the above referenced article entitled "Almost color mixture functions" as well as in references 2, 5 and 6 thereof. Preferably, the illumination of analog representations 610 and 612 should be such that their respective white areas will be of substantially the same brightness.

Application 7: Calibration of an Input Device to an Image Processing Device

Image creation and processing systems may be used to merge or combine more than one color image into a single color image and\or to modify input color images. For example, it may be desired to create a color image comprising a first portion obtained by photographic techniques and subsequently read into the image processing system, preferably using conventional scanning techniques, and a second portion generated by the graphic software of the image processing system. Alternatively or in addition, it may be desired to use the graphic software of the image processing system to modify a digital representation of a photographic image or of any other color image generated externally of the image processing system.

Unfortunately, the coordinates used to define internally generated images, denoted here as creation system coordinates, are typically different than those used to define externally generated images, denoted here as scanner coordinates. For example, a RGB color value (0,0,10) in scanner coordinates might result in a first input color blue while producing an output of a second color blue in creation system coordinates. However, when combining internally and externally generated images, or when modifying an externally generated image within the graphic software, it is desired to match the two coordinate systems such that the RGB color value (0,0,10) represents the same color for the scanner input and the image processing unit.

A preferred method and apparatus for achieving one or both of the above objectives is shown and described herein. The apparatus and method shown and described herein have the particular advantage of automatically and generally without resorting to human judgement providing an output from the image processing system which generally resembles the input thereto, apart from the modifications or merge operations performed on the input by the image processing system. In this context, two analog representations resemble one another if a color reading device reading both representations will output substantially the same digital representation for both analog representations.

Reference is now made to Fig. 13 which illustrates calibration of an image processing system comprising a color reading device 932, such as a scanner, means for modifying a digital representation of a color image, such as graphic software 954 (Fig. 14), and a color output device 926, such as a plotter or other color output apparatus. The calibration enables an image read by the scanner 932 to be processed and to be subsequently output by the plotter 926, substantially without causing distortion of the representation of the color image input to the scanner 932, except for the intentional modifications performed thereupon by the image processing system.

As seen in Fig. 13, a digital database 922 is input to, generated in, read from an analog image, or otherwise made available to an image processing unit 924. The digital database 922 generally comprises a plurality of digital color values, defined in the color coordinate system of image processing unit 924.

The database 922 typically comprises a digital file which may be generated by any suitable means, such as via graphic software, or alternatively may be input into the image processing system by any suitable communication method, such as via magnetic tape. Database 922 is output by color output apparatus 926, such as a 4cast plotter, commercially available from DuPont, on any suitable substrate 928, such as a transparency, thereby to provide an analog representation 930 corresponding to the digital representation 922 of the database. Preferably the substrate 928 should be of the same medium as the substrate which it is desired to use to bear the analog images 950 which it is intended to process (Fig. 14). By 'same medium' it is meant the same product. Thus, if it is intended to process using ektachrome substrates produced by Kodak Corporation of the USA, then ektachrome substrates are preferably used for substrate 928.

Analog representation 930 is read by color reading device 932, which may comprise any suitable device such as the Smart Scanner, commercially available from Scitex Corporation, Herzlia, Israel. Scanner 932 produces a digital representation 934 whose color values are defined in the coordinate system of scanner 932.

Digital representation 934 of the database and the original digital representation 922 of the database are both then input into transformation construction apparatus 936. Transformation construction apparatus 936 is operative to construct a transformation from the digital representation 934 to the digital representation 922 and to output this transformation in any suitable form. The transformation is, effectively, a transformation from the color coordinate system of the scanner 932 to that of the image processing unit 924 combined with the output device 926.

Preferably, the transformation is output and stored as a LookUp Table (LUT) 938. The LUT 938 may subsequently be loaded onto scanner 932 or onto suitable computing means, such as an IBM PC or a suitable module that may exist in the image processing unit 924, and may then be used as described hereinbelow with reference to Fig. 14.

Transformation construction apparatus 936 is preferably constructed and operative as described hereinabove.

The plurality of digital color values of database 922 typically represents the color space in which the operator of the image processing apparatus works. It typically has a predetermined pattern, typically comprising patches of color, which typically has at least a minimum density of data (digital color values) in every location of interest. The predetermined pattern may, for example, be a generally even distribution throughout generally the entirety of the producible color space. If certain volumes of the color space are more important to the operator, then the operator may define more color patches in that volume to allow a more accurate represenation of the volume.

Specifically, the operator may produce his desired database 922 as follows:

1. An initial database of patches is produced wherein the colors of the patches have a subset of possible three dimensional eight bit digital color values, where a typical subset is defined as the following combinations of Red (R), Green (G) and Blue (B):

$$R = n*50$$
$$G = m*50 \qquad (6)$$
$$B = p*50$$

where n, m and p are the entirety of integer values between 0 and 5, inclusive. This produces 216 patches.

2. The initial database is output, to a substrate such as film, by the output device 926, thereby producing an analog output.

3. The operator visually selects on the analog output those patches of the initial database that are included in the color space volume that he wishes to be more accurately represented in his desired database 922 and indicates his selections to image processing unit 924. For example, one selected patch might be the patch that was created by:

R = 50, G = 100, B = 150.

4. For each selected patch, a plurality of patches are created which are close to it in color. For example, eight more colors might be created which are in the color volume around the selected example color by taking the entirety of combinations of:

$$R = n*25 + 50$$
$$G = m*25 + 100 \quad (7)$$
$$B = p*25 + 150$$

where n, m and p are either 1 or -1.

An alternative method for constructing a database with a desired distribution is as described hereinabove with respect to Figs. 7A and 7B.

Use of the calibrated apparatus of Fig. 13 will now be described, with reference to Fig. 14. There is shown an analog representation 950 of a color image which it is desired to process, using the image processing system of Fig. 13 which comprises graphic software 954 or any other suitable means for producing or modifying representations of color images, including combining or merging means 956 for combining more than one representation of color images into a single representation of a single, combined color image, as well as the scanner 932 and the output device 926.

As shown, the analog representation 950 is read by a color reading device 932, such as a Smart Scanner, commercially available from Scitex Corporation, which is substantially identical to scanner 932 of Fig. 13, and which is loaded with LUT 938 of Fig. 13. Alternatively, the color reading device 932 may not be loaded with LUT 938 nor with any representation of the transformation constructed by transformation construction means 936 of Fig. 13. Instead, the output of color separation unit 952 of the scanner 932, normally in the form of RGB separations or quasi log of RGB separations of the scanner, may be input into transformation operation means 958. Transformation operation means 958 may comprise any suitable computer, such as an IBM PC or a module of the image processing system 924, and is operative to transform the input thereto in accordance with LUT 938 constructed by transformation computation means 936 of Fig. 13.

The transformed output of scanner 932, typically comprising a digital file 960 in the color coordinate system of the image processing system 924, is input to image processing system 924, typically comprising graphic software 954 and/or merging means 956. The digital file 960 may be modified by graphic software 954 and/or it may be merged with another digital image 962 by merging means 956. The merged image may, if desired, be modified by graphics software 954. The final modified and/or merged digital representation 964 is then transformed into an analog image 966, using output device 926 of Fig. 13. The portions of analog image 966 from inital image 950 which did not undergo the modification described hereinabove will be substantially identical in appearance to the initial image 950.

Any suitable method may be employed for merging at least a portion of the digital file 960 with at least a portion of digital image 962. Apparatus and methods for merging color images are described and claimed in Applicant's Israel Application No. 93493, the disclosure of which is incorporated herein by reference.

It will be appreciated by persons skilled in the art that the present invention is not limited to what has been particularly shown and described hereinabove. Rather, the scope of the present invention is defined only by the claims that follow:

C L A I M S

1. A technique for calibrating a color processing device comprising the steps of:

comparing a first digital representation of a colored image with a second digital representation thereof, said first digital representation defining a plurality of first non-scalar color values, said second digital representation defining a plurality of second non-scalar color values corresponding to the plurality of said first non-scalar color values, thereby to provide a transformation pairing each individual one of said first non-scalar color values with a value relatively close to the corresponding one of said second non-scalar color values; and employing at least the transformation to control operation of said color processing device to be calibrated, whereby the color processing device may be calibrated generally without reference to human aesthetic judgement.

2. A technique according to claim 1, said technique being algorithmic.

3. A technique according to claim 1, said technique being non-interactive.

4. A technique according to claim 1 and wherein said first and second digital representations are not provided by a colorimeter.

5. A technique according to claim 1 and wherein said first and second digital representations are not in an XYZ coordinate system.

6. A technique according to claim 1 and wherein said first and second digital representations are read by color reading apparatus whose colorimetric response differs from the colorimetric response of the human eye.

7. A technique according to claim 1 and wherein said first and second digital representations are read by color reading apparatus whose colorimetric response is not mathematically transformable to any colorimetric response similar to the colorimetric response of the human eye.

8. A technique according to claim 1 and wherein at least some of said non-scalar color values comprise a black component.

9. A technique according to claim 1 and wherein said plurality of first non-scalar color values comprises a plurality of 3-dimensional color values.

10. A technique according to claim 1 and wherein said plurality of second non-scalar color values comprises a plurality of 3-dimensional color values.

11. A technique according to claim 1 and wherein said color processing device comprises a color reading device.

12. A technique according to claim 1 and wherein said color processing device comprises a printing device.

13. A technique according to claim 1 and also comprising, prior to said step of comparing, the step of automatically scanning an analog representation of said colored image, thereby to provide at least one of said first and second digital representations.

14. A technique according to claim 1 and also comprising the step of using said calibrated device to create upon a second substrate a duplication of an analog representation of a colored image upon a first substrate.

15. A technique according to claim 1 and also comprising the step of using said calibrated device to create an input copy of a colored image which, when processed by said calibrated device, will result in a given output copy of said colored image.

16. A technique according to claim 11 and also comprising the step of:

comparing the second digital representation with a third digital representation of the colored image, said third digital representation defining a plurality of third non-scalar color values, thereby to provide a second transformation pairing each individual one of said second non-scalar color values with a value relatively close to the correpsonding one of said third non-scalar color values;

and wherein said step of employing comprises the step of employing both said transformations to control operation of said color processing device to be calibrated.

17. A technique according to claim 1 and wherein said color processing device to be calibrated comprises a color monitor display.

18. A technique according to claim 1 and wherein said first digital representation is characterized in that processing said first digital representation of said colored image with the color processing device provides a second representation of said colored image which defines a provided plurality of color values, each individual one of said provided plurality of color values being substantially equal to a corresponding one of a predetermined plurality of color values falling within the range of said color processing device.

19. Apparatus for sampling the color processing characteristics of a color processing device, said color processing device being operative to convert a first representation of a colored image to a second representation thereof, said sampling apparatus comprising:

a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within the range of said color processing device.

20. Apparatus according to claim 19 and wherein said predetermined plurality of color values is characterized in that generally any region of a given size at least partially overlapping the range of the color processing device contains therewithin at least a predetermined number of color values.

21. Apparatus according to claim 19 and wherein said first representation comprises a digital representation.

22. Apparatus according to claim 19 and wherein said first representation comprises an analog representation.

23. Apparatus according to claim 19 and wherein said second representation comprises a digital representation.

24. A method of constructing apparatus for sampling the color processing characteristics of a color processing device, said color processing device being operative to convert a first representation of a colored image to a second representation thereof, the method comprising the step of repeating at least once the steps of:

providing first and second representations of a colored image, said representations respectively comprising a first multiplicity of first color values and a second multiplicity of second color values corresponding thereto, said first and second representations being characterized in that processing said first representation with said color processing device defines said second representation;

comparing the first representation of the colored image with the second representation thereof, thereby to provide a transformation, characterized in that operating said transformation on each individual one of said second multiplicity of second color values gives a value substantially equal to the corresponding one of said first multiplicity of first color values; and operating the transformation on said first representation of the colored image, thereby to provide a third representation thereof.

25. A technique according to claim 1 and wherein said transformation is a function defined and continuous over generally the entirety of the range of the color processing device.

26. A technique according to claim 24 and wherein said transformation is a function defined and continuous over generally the entirety of the range of the color processing device.

27. Apparatus for sampling the color processing characteristics of a color processing device, said sampling apparatus being constructed in accordance with the method of claim 3.

28. A method according to claim 24 and wherein said step of repeating at least once comprises the step of repeating at least twice the steps of providing, processing, comparing and operating and wherein for each repetition from the second onward, the first representation of the colored image provided comprises the third representation of the colored image provided in the previous repetition.

29. A method according to claim 28 wherein said third representation defines a plurality of color values and wherein said step of repeating at least twice comprises the step of repeating the steps of providing, processing, comparing and operating until the plurality of color values defined by the third representation obtained in the last repetition are at a predetermined degree of closeness to a predetermined plurality of color values located within the range of the color processing device.

30. A technique for quality control of a color processing device operative to convert a first representation of a colored image to a second representation thereof, the technique comprising the steps of:

providing apparatus for sampling the color processing characteristics of the color processing device, said sampling apparatus comprising a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within the range of said color processing device;

processing said sampling apparatus on said color processing device; and employing the results of the processing step of control oepration of the color processing device.

31. A technique for repeatibility testing of a color processing device operative to convert a first representation of a colored image to a second representation thereof, the technique comprising the steps of:

providing apparatus for sampling the color processing characteristics of the color processing device, said sampling apparatus comprising a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within the range of said color processing device;

processing said sampling apparatus on said color processing device;

repeating said step of processing on at least one further occasion; and comparing the results of at least two repetitions of said processing steps.

32. A method for transforming an element of a domain of a first color printing device to an element of a domain of a second color printing device, the method comprising the steps of:

providing a first transformation from a first digital representation of a colored image to a second digital representation thereof and a second transformation from a third digital representation of a colored image to a fourth digital representation thereof, said second transformation corresponding to said second color printing device, said first transformation corresponding to said first color printing device and said second and fourth digital representations being defined within a single color space; and comparing said first transformation with said second transformation.

33. A method according to claim 32 and also comprising the step of storing the results of said comparing step.

34. A method according to claim 33 wherein the results of said comparing step define a first plurality of matchings between a first plurality of elements of the domain of the second color printing device and a corresponding first plurality of elements of the domain of the first color printing device and wherein said step of storing comprises the step of providing a second plurality of matchings between the domain of the first color printing device and the domain of the second color printing device, said second plurality exceeding said first plurality in number.

35. A method according to claim 34 and wherein said storing step also comprises, prior to said step of providing a second plurality of matchings, the step of modifying at least some of said corresponding first plurality of elements of the domain of the first color printing device.

36. A method according to claim 34 and wherein said step of providing comprises the step of interpolating between individual ones of said first plurality of matchings, thereby to provide individual ones from among said second plurality of matchings.

37. A method according to claim 36 and wherein said step of interpolating comprises the step of carrying out nonlinear interpolation between individual ones of said first plurality of matchings.

38. A method according to claim 37 and wherein said step of carrying out non-linear interpolation comprises the step of fitting a tensor of splines to individual ones of said first plurality of elements of said first domain.

39. A method according to claim 33 and also comprising the step of employing said stored results to control operation of said first color printing device.

40. A method according to claim 32 and wherein said step of comparing comprises the steps of:

searching among the elements of said second digital representation for a plurality of close elements whose values are close to an element of said fourth digital representation;

forming a multiplicity of subsets, each individual one of said subsets containing some of said plurality of close elements;

selecting individual ones from among said multiplicity of subsets;

for each individual selected subset, combining the elements of said first digital representation corresponding to the members of the individual selected subset, thereby to define a combination value for said individual selected subset; and combining said combination values of each of said individual selected subsets, thereby to provide an element within said first digital representation corresponding to said element within said fourth representation.

41. A method according to claim 40 and wherein said first step of combining comprises the steps of:

assigning a weight to each member of each individual selected subset, said weights being characterized in that, for each individual selected subset, said element of said fourth digital representation is the center of mass of the weighted members of that subset; and computing a weighted sum of said members of said individual selected subset.

42. A method according to claim 40 and wherein said second step of combining comprises the steps of:

assigning a weight to each individual selected subset, said weights reflecting the arrangement of the members of said individual selected subset relative to said element of said fourth digital representation;

computing a weighted sum of said members of said individual selected subset.

43. A method according to claim 42 and wherein said step of selecting comprises the steps of:

inspecting the arrangements of the members of said multiplicity of subsets relative to said element of said fourth digital representation; and selecting individual ones from among said multiplicity of subsets in accordance with the result of said step of inspecting.

44. A method for quantifying the appearance of an analog representation of a location of a colored image comprising the step of:

providing an n-dimensional representation of said location, wherein n is at least 4.

45. A method according to claim 44 wherein said analog representation of said location was provided by printing a digital representation of said location and wherein said step of providing comprises the steps of:

providing a 3 dimensional representation of the color of said location;

computing at least a fourth value as a function of said digital representation of said location.

46. A method according to claim 45 and wherein said three dimensional representation is a colorimetric representation.

47. A method according to claim 46 and wherein said colorimetric representation is CIE XYZ.

48. A method according to claim 46 and wherein said colorimetric representation is CIE L*a*b*.

49. A method according to claim 33 and including the step of producing a new first transformation using said stored results and repeating said steps of comparing and storing thereby to produce a new transformation between an element of said domain of said first color printing device to an element of said domain of said second color printing device.

50. A method according to claim 49 and wherein said step of employing utilizes a color converter for converting said domain of said first color printing device to said domain of said second color printing device.

51. Apparatus for transforming an element of a domain of a first color printing device to an element of a domain of a second color printing device comprising;

means for providing a first transformation from a first digital representation of a colored image to a second digital representation thereof and a second transformation from a third digital representation of a colored image to a fourth digital representation thereof, said second transformation corresponding to said second color printing device, said first transformation corresponding to said first color printing device and said second and fourth digital representations being defined within a single color space; and means for comparing said first transformation with said second transformation.

52. Apparatus according to claim 51 and also comprising means for storing the output of said means for comparing.

53. Apparatus according to claim 51 wherein the output of the means for comparing define a first plurality of matchings between a first plurality of elements of the domain of the second color printing device and a corresponding first plurality of elements of the domain of the first color printing device and wherein the means for storing comprise means for providing a second plurality of matchings between the domain of the first color printing device and the domain of the second color printing device, said second plurality exceeding said first plurality in number.

54. Apparatus according to claim 53 and wherein said means for storing also comprise means for modifying at least some of said corresponding first plurality of elements of the domain of the first color printing device operative prior to the operation of said means for providing a second plurality of matchings, 55. Apparatus according to claim 53 and wherein said means for providing comprise means for interpolating between individual ones of said first plurality of matchings, thereby to provide individual ones from among said second plurality of matchings.

56. Apparatus according to claim 55 and wherein said means for interpolating comprise means for carrying out non-linear interpolation between individual ones of said first plurality of matchings.

57. Apparatus according to claim 56 and wherein said means for carrying out non-linear interpolation comprise means for fitting a tensor of splines to individual ones of said first plurality of elements of said first domain.

58. Apparatus according to claim 52 and also comprising means for employing said stored results to control operation of said first color printing device.

59. Apparatus according to claim 51 and wherein said means for comparing comprise:

means for searching among the elements of said second digital representation for a plurality of close elements whose values are close to an element of said fourth digital representation;

means for forming a multiplicity of subsets, each individual one of said subsets containing some of said plurality of close elements;

means for selecting individual ones from among said multiplicity of subsets;

for each individual selected subset, first means for combining the elements of said first digital representation corresponding to the members of the individual selected subset, thereby to define a combination value for said individual selected subset; and second means for combining said combination values of each of said individual selected subsets, thereby to provide an element within said first digital representation corresponding to said element within said fourth representation.

60. Apparatus according to claim 59 and wherein said first means for combining comprise;

means for assigning a weight to each member of each individual selected subset, said weights being characterized in that, for each individual selected subset, said element of said fourth digital representation is the center of mass of the weighted members of that subset; and means for computing a weighted sum of said members of said individual selected subset.

61. Apparatus according to claim 59 and wherein said second means for combining comprise;

means for assigning a weight to each individual selected subset, said weights reflecting the arrangement of the members of said individual selected subset relative to said element of said fourth digital representation; and means for computing a weighted sum of said members of said individual selected subset.

62. Apparatus according to claim 61 and wherein said means for selecting comprise;

means for inspecting the arrangements of the members of said multiplicity of subsets relative to said element of said fourth digital representation; and means for selecting individual ones from among said multiplicity of subsets in accordance with the result of said step of inspecting.

63. Apparatus for quantifying the appearance of an analog representation of a location of a colored image comprising;

means for providing an n-dimensional representation of said location, wherein n is at least 4.

64. Apparatus according to claim 63 wherein said analog representation of said location is provided by printing a digital representation of said location and wherein said means for providing comprise;

means for providing a 3 dimensional representation of the color of said location;

means for computing at least a fourth value as a function of said digital representation of said location.

65. Apparatus according to claim 64 and wherein said three dimensional representation is a colorimetric representation.

66. Apparatus according to claim 64 and wherein said colorimetric representation is CIE XYZ.

67. Apparatus according to claim 64 and wherein said colorimetric representation is CIE L*a*b*.

68. Apparatus according to claim 52 and including means for producing a new first transformation using said stored output and means for repeatedly operating said means for comparing and for storing thereby to produce a new transformation between an element of said domain of said first color printing device to an element of said domain of said second color printing device.

69. Apparatus according to claim 58 and wherein said means for employing utilize a color converter for converting said domain of said first color printing device to said domain of said second color printing device.

70. A system for converting between a digital and an analog representation of an image comprising:

a translation system for translating a reading and writing point across a substrate;

a color proofer comprising said writing point for writing, from said digital representation, said analog representation onto said substrate; and a color reading system comprising said reading point for reading said digital representation from said analog representation.

71. A system according to claim 70 and wherein said translation system comprises a drum for rotating said substrate and a translating carriage for translating along said drum.

72. A system according to claim 70 and also including means for transforming an element of a domain of a first color printing device to an element of a domain of a second color printing device.

73. A system according to claim 72 and wherein said means for transforming comprise;

means for providing a first transformation from a first digital representation of a colored image to a second digital representation thereof and a second transformation from a third digital representation of a colored image to a fourth digital representation thereof; and means for comparing said first transformation with said second transformation;

said second transformation corresponding to said second color printing device, said first transformation corresponding to said first color printing device and said second and fourth digital representations being defined within a single color space.

74. A method according to claim 73 and wherein said means for comparing comprise:

means for searching among the elements of said second digital representation for a plurality of close elements whose values are close to an element of said fourth digital representation;

means for forming a multiplicity of subsets, each individual one of said subsets containing some of said plurality of . close elements;

means for selecting individual ones from among said multiplicity of subsets;

for each individual selected subset, means for combining the elements of said first digital representation corresponding to the members of the individual selected subset, thereby to define a combination value for said individual selected subset; and means for combining said combination values of each of said individual selected subsets, thereby to provide an element within said first digital representation corresponding to said element within said fourth representation.

75. A technique for controlling the operation of an image processing device having a first color coordinate system and comprising the steps of:

receiving a digital representation of a color image defined in a second color coordinate system;

providing a transformation between said first color coordinate system and said second color coordinate system;

employing said transformation to transform said digital representation of said color image into a transformed digital representation of said color image in said first color coordinate system; and employing said image processing device to modify said transformed digital representation of said color image.

76. A technique according to claim 75 and wherein said digital representation is provided by an input device.

77. A technique according to claim 76 and wherein said second color coordinate system is the coordinate system of the input device.

78. A technique according to claim 75 and wherein said step of employing said transformation is performed by a device having said second color coordinate system.

79. A technique according to claim 75 and wherein said step of employing said transformation is performed by said image processing device.

80. An image processing device having a first color coordinate system comprising:

means for receiving a digital representation of a color image defined in a second color coordinate system;

transformation construction means for providing a transformation between said first color coordinate system and said second color coordinate system; and means for employing said transformation to transform said digital representation of said color image into a transformed digital representation of said color image in said first color coordinate system, wherein said image processing device is operative to modify said transformed digital representation of said color image.

81. An image processing device according to claim 80 and wherein said digital representation is provided by an input device.

82. An image processing device according to claim 81 and wherein said second color coordinate system is the coordinate system of the input device.

83. An image processing device according to claim 80 and wherein said transformation construction means form part of a device having said second color coordinate system.

421 422

433 434

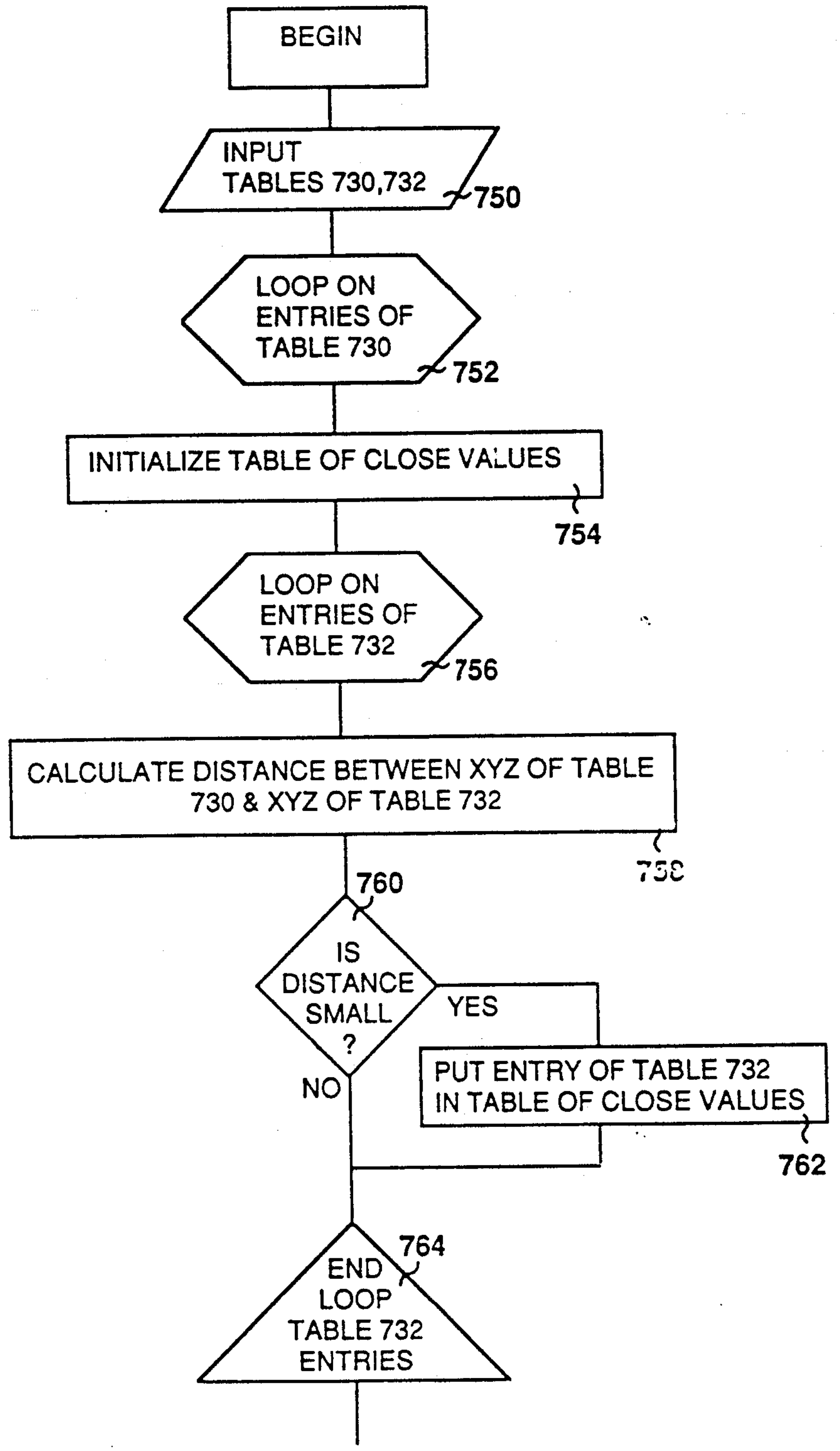
FIG.10/1

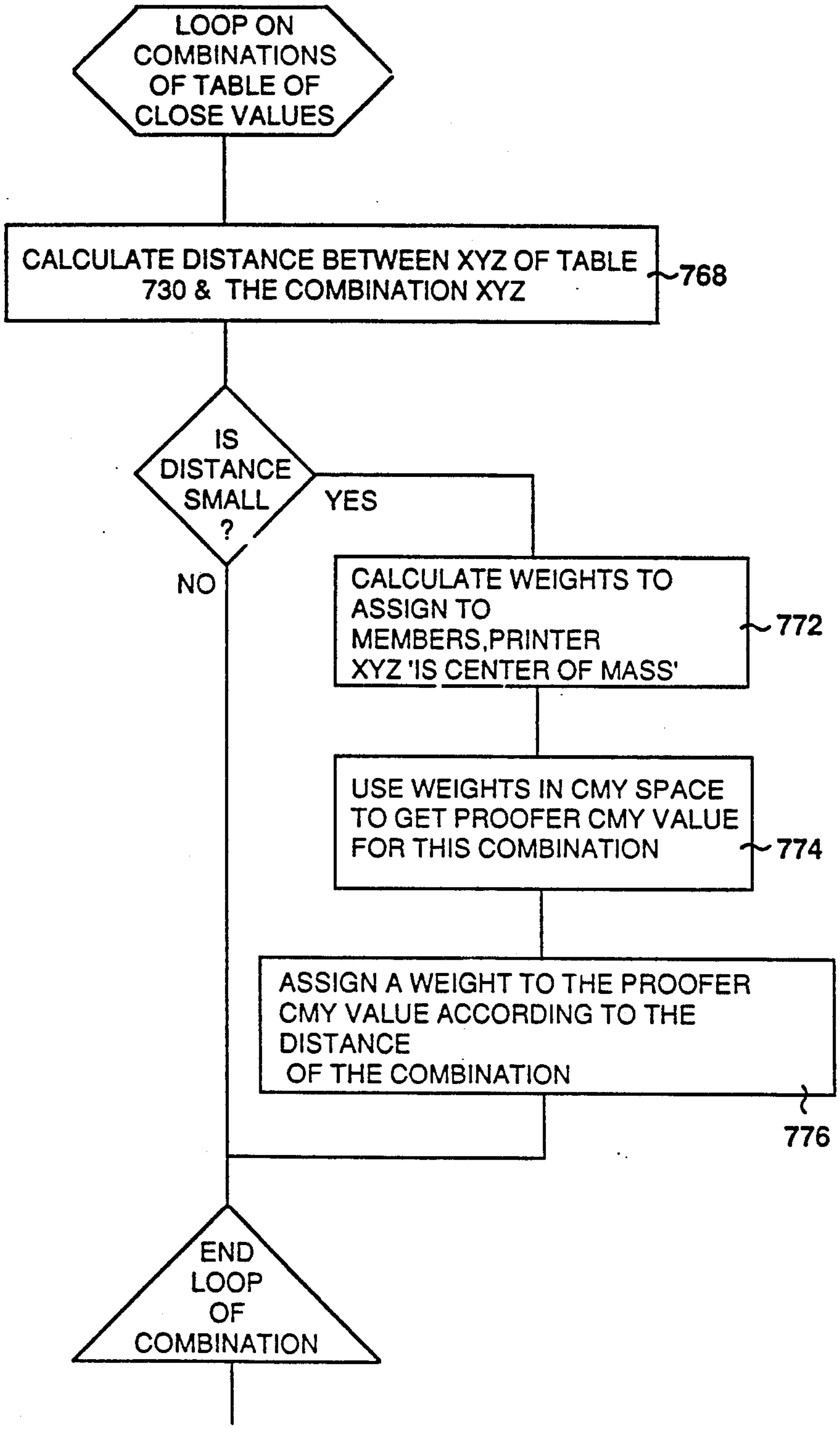
FIG.10/2

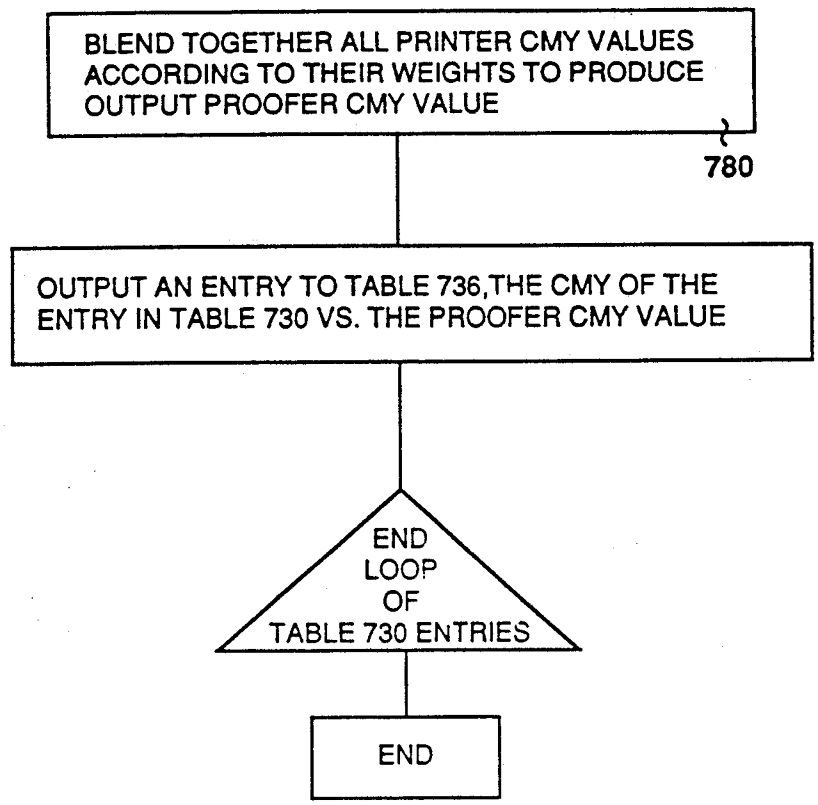
FIG.10/3

APPENDIX - D

```
L5A1358.NET        Thu Dec 20 09:25:10 1990        1

COMPILE            ;
DIRECTORY MASTER   ;
OPTIONS REPLACE,XREF ;

/* * * * * * *  Contents of NET file SPT_V1.NET  * * * * * * */

/*****************************************************/
/*  Netlist copyright (C) 1989 LSI Logic Corporation  */
/*****************************************************/


MODULE SPT_V1;

INPUTS      ALE,COF_ADRIN.2,COF_ADRIN.1,COF_ADRIN.0,CP,CS_,
            INT_GT_1IN,MPA.7,MPA.6,MPA.5,MPA.4,MPA.3,MPA.2,MPA.1,
            MPA.0,MPD.15,MPD.14,MPD.13,MPD.12,MPD.11,MPD.10,MPD.9,
            MPD.8,MPD.7,MPD.6,MPD.5,MPD.4,MPD.3,MPD.2,MPD.1,MPD.0,
            PXL_EN,RC0.7,RC0.6,RC0.5,RC0.4,RC0.3,RC0.2,RC0.1,
            RC0.0,RC1.7,RC1.6,RC1.5,RC1.4,RC1.3,RC1.2,RC1.1,RC1.0,
            RC2.7,RC2.6,RC2.5,RC2.4,RC2.3,RC2.2,RC2.1,RC2.0,RC3.7,
            RC3.6,RC3.5,RC3.4,RC3.3,RC3.2,RC3.1,RC3.0,RC4.7,RC4.6,
            RC4.5,RC4.4,RC4.3,RC4.2,RC4.1,RC4.0,RDY_I,RD_,RESET_,
            STOP,STRT,TST,WAIT,WR_,XSCNIN,YDWN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
            CNVL.4,CNVL.3,CNVL.2,CNVL.1,CNVL.0,MPD.15,MPD.14,
            MPD.13,MPD.12,MPD.11,MPD.10,MPD.9,MPD.8,MPD.7,MPD.6,
            MPD.5,MPD.4,MPD.3,MPD.2,MPD.1,MPD.0,PTST,REQ_I,REQ_O,
            STB_I,YINT,YINTSND;

LEVEL FUNCTION;
DEFINE
  /* implicit connectors ******************/

    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    REQ_O- = (REQ_O);
    CNVL-.12 = (CNVL.12);
    CNVL-.11 = (CNVL.11);
    CNVL-.10 = (CNVL.10);
    CNVL-.9 = (CNVL.9);
    CNVL-.8 = (CNVL.8);
    CNVL-.7 = (CNVL.7);
    CNVL-.6 = (CNVL.6);
    CNVL-.5 = (CNVL.5);
    CNVL-.4 = (CNVL.4);
    CNVL-.3 = (CNVL.3);
    CNVL-.2 = (CNVL.2);
    CNVL-.1 = (CNVL.1);
    CNVL-.0 = (CNVL.0);
    YINT- = (YINT);
    YINTSND- = (YINTSND);
    REQ_I- = (REQ_I);
    STB_I- = (STB_I);
    CLRXCNT_- = (CLRXCNT_);
    WR_- = (WR_);
    ALE- = (ALE);
    MPA-.7 = (MPA.7);
    MPA-.6 = (MPA.6);
    MPA-.5 = (MPA.5);
    MPA-.4 = (MPA.4);
    MPA-.3 = (MPA.3);
    MPA-.2 = (MPA.2);
    MPA-.1 = (MPA.1);
    MPA-.0 = (MPA.0);
    WAIT- = (WAIT);
```

```
STRT- = (STRT);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
COF_ADRIN-.2 = (COF_ADRIN.2);
COF_ADRIN-.1 = (COF_ADRIN.1);
COF_ADRIN-.0 = (COF_ADRIN.0);
INT_GT_1IN- = (INT_GT_1IN);
STOP- = (STOP);
RD_- = (RD_);
CS_- = (CS_);
RDY_I- = (RDY_I);
RESET_- = (RESET_);
YUP- = (YUP);
U33.PI- = (NC/1/);
U28.TN- = (NC/1/);
MPD-.15 = (MPD.15);
MPD-.14 = (MPD.14);
MPD-.13 = (MPD.13);
MPD-.12 = (MPD.12);
MPD-.11 = (MPD.11);
MPD-.10 = (MPD.10);
MPD-.9 = (MPD.9);
MPD-.8 = (MPD.8);
MPD-.7 = (MPD.7);
MPD-.6 = (MPD.6);
MPD-.5 = (MPD.5);
MPD-.4 = (MPD.4);
MPD-.3 = (MPD.3);
MPD-.2 = (MPD.2);
MPD-.1 = (MPD.1);
MPD-.0 = (MPD.0);
PTST- = (PTST);
CP- = (CP);
YSCNIN- = (YSCNIN);
XSCNIN- = (XSCNIN);
TST- = (TST);
PXL_EN- = (PXL_EN);
YDWN- = (YDWN);
```

```
/* part instances **************************/

  U34.4(BMYL-.4=Z) = &B8R(U0.BMYL-.4=A);
  U34.3(BMYL-.3=Z) = &B8R(U0.BMYL-.3=A);
  U34.2(BMYL-.2=Z) = &B8R(U0.BMYL-.2=A);
  U34.1(BMYL-.1=Z) = &B8R(U0.BMYL-.1=A);
  U34.0(BMYL-.0=Z) = &B8R(U0.BMYL-.0=A);
  U22(REQ_O-=Z) = &B8R(U0.REQ_O-=A);
  U23.12(CNVL-.12=Z) = &B10R(U0.CNVL-.12=A);
  U23.11(CNVL-.11=Z) = &B10R(U0.CNVL-.11=A);
  U23.10(CNVL-.10=Z) = &B10R(U0.CNVL-.10=A);
  U23.9(CNVL-.9=Z) = &B10R(U0.CNVL-.9=A);
  U23.8(CNVL-.8=Z) = &B10R(U0.CNVL-.8=A);
  U23.7(CNVL-.7=Z) = &B10R(U0.CNVL-.7=A);
  U23.6(CNVL-.6=Z) = &B10R(U0.CNVL-.6=A);
  U23.5(CNVL-.5=Z) = &B10R(U0.CNVL-.5=A);
  U23.4(CNVL-.4=Z) = &B10R(U0.CNVL-.4=A);
  U23.3(CNVL-.3=Z) = &B10R(U0.CNVL-.3=A);
  U23.2(CNVL-.2=Z) = &B10R(U0.CNVL-.2=A);
  U23.1(CNVL-.1=Z) = &B10R(U0.CNVL-.1=A);
  U23.0(CNVL-.0=Z) = &B10R(U0.CNVL-.0=A);
  U24(YINT-=Z) = &B8R(U0.YINT-=A);
  U25(YINTSND-=Z) = &B8R(U0.YINTSND-=A);
  U26(REQ_I-=Z) = &B8R(U0.REQ_I-=A);
  U27(STB_I-=Z) = &B10R(U0.STB_I-=A);
  U5(CLRXCNT_-=Z) = &B8R(U0.CLRXCNT_-=A);
  U9.7(U9.Z-.7=Z,U9.PO-.7=PO) = &TLCHTU(U9.PI-.7=PI,MPA-.7=A);
  U9.6(U9.Z-.6=Z,U9.PO-.6=PO) = &TLCHTU(U9.PI-.6=PI,MPA-.6=A);
  U9.5(U9.Z-.5=Z,U9.PO-.5=PO) = &TLCHTU(U9.PI-.5=PI,MPA-.5=A);
  U9.4(U9.Z-.4=Z,U9.PO-.4=PO) = &TLCHTU(U9.PI-.4=PI,MPA-.4=A);
  U9.3(U9.Z-.3=Z,U9.PO-.3=PO) = &TLCHTU(U9.PI-.3=PI,MPA-.3=A);
  U9.2(U9.Z-.2=Z,U9.PO-.2=PO) = &TLCHTU(U9.PI-.2=PI,MPA-.2=A);
  U9.1(U9.Z-.1=Z,U9.PO-.1=PO) = &TLCHTU(U9.PI-.1=PI,MPA-.1=A);
  U9.0(U9.Z-.0=Z,U9.PO-.0=PO) = &TLCHTU(U9.PI-.0=PI,MPA-.0=A);
  U4.7(U4.Z-.7=Z,U4.PO-.7=PO) = &TLCHTU(U4.PI-.7=PI,RC4-.7=A);
  U4.6(U4.Z-.6=Z,U4.PO-.6=PO) = &TLCHTU(U4.PI-.6=PI,RC4-.6=A);
  U4.5(U4.Z-.5=Z,U4.PO-.5=PO) = &TLCHTU(U4.PI-.5=PI,RC4-.5=A);
  U4.4(U4.Z-.4=Z,U4.PO-.4=PO) = &TLCHTU(U4.PI-.4=PI,RC4-.4=A);
  U4.3(U4.Z-.3=Z,U4.PO-.3=PO) = &TLCHTU(U4.PI-.3=PI,RC4-.3=A);
  U4.2(U4.Z-.2=Z,U4.PO-.2=PO) = &TLCHTU(U4.PI-.2=PI,RC4-.2=A);
  U4.1(U4.Z-.1=Z,U4.PO-.1=PO) = &TLCHTU(U4.PI-.1=PI,RC4-.1=A);
  U4.0(U4.Z-.0=Z,U4.PO-.0=PO) = &TLCHTU(U4.PI-.0=PI,RC4-.0=A);
  U3.7(U3.Z-.7=Z,U3.PO-.7=PO) = &TLCHTU(U3.PI-.7=PI,RC3-.7=A);
  U3.6(U3.Z-.6=Z,U3.PO-.6=PO) = &TLCHTU(U3.PI-.6=PI,RC3-.6=A);
  U3.5(U3.Z-.5=Z,U3.PO-.5=PO) = &TLCHTU(U3.PI-.5=PI,RC3-.5=A);
  U3.4(U3.Z-.4=Z,U3.PO-.4=PO) = &TLCHTU(U3.PI-.4=PI,RC3-.4=A);
  U3.3(U3.Z-.3=Z,U3.PO-.3=PO) = &TLCHTU(U3.PI-.3=PI,RC3-.3=A);
  U3.2(U3.Z-.2=Z,U3.PO-.2=PO) = &TLCHTU(U3.PI-.2=PI,RC3-.2=A);
  U3.1(U3.Z-.1=Z,U3.PO-.1=PO) = &TLCHTU(U3.PI-.1=PI,RC3-.1=A);
  U3.0(U3.Z-.0=Z,U3.PO-.0=PO) = &TLCHTU(U3.PI-.0=PI,RC3-.0=A);
  U21.7(U21.Z-.7=Z,U21.PO-.7=PO) = &TLCHTU(U21.PI-.7=PI,RC2-.7=A);
  U21.6(U21.Z-.6=Z,U21.PO-.6=PO) = &TLCHTU(U21.PI-.6=PI,RC2-.6=A);
  U21.5(U21.Z-.5=Z,U21.PO-.5=PO) = &TLCHTU(U21.PI-.5=PI,RC2-.5=A);
  U21.4(U21.Z-.4=Z,U21.PO-.4=PO) = &TLCHTU(U21.PI-.4=PI,RC2-.4=A);
  U21.3(U21.Z-.3=Z,U21.PO-.3=PO) = &TLCHTU(U21.PI-.3=PI,RC2-.3=A);
  U21.2(U21.Z-.2=Z,U21.PO-.2=PO) = &TLCHTU(U21.PI-.2=PI,RC2-.2=A);
  U21.1(U21.Z-.1=Z,U21.PO-.1=PO) = &TLCHTU(U21.PI-.1=PI,RC2-.1=A);
  U21.0(U21.Z-.0=Z,U21.PO-.0=PO) = &TLCHTU(U21.PI-.0=PI,RC2-.0=A);
  U2.7(U2.Z-.7=Z,U2.PO-.7=PO) = &TLCHTU(U2.PI-.7=PI,RC1-.7=A);
  U2.6(U2.Z-.6=Z,U2.PO-.6=PO) = &TLCHTU(U2.PI-.6=PI,RC1-.6=A);
  U2.5(U2.Z-.5=Z,U2.PO-.5=PO) = &TLCHTU(U2.PI-.5=PI,RC1-.5=A);
  U2.4(U2.Z-.4=Z,U2.PO-.4=PO) = &TLCHTU(U2.PI-.4=PI,RC1-.4=A);
  U2.3(U2.Z-.3=Z,U2.PO-.3=PO) = &TLCHTU(U2.PI-.3=PI,RC1-.3=A);
  U2.2(U2.Z-.2=Z,U2.PO-.2=PO) = &TLCHTU(U2.PI-.2=PI,RC1-.2=A);
  U2.1(U2.Z-.1=Z,U2.PO-.1=PO) = &TLCHTU(U2.PI-.1=PI,RC1-.1=A);
  U2.0(U2.Z-.0=Z,U2.PO-.0=PO) = &TLCHTU(U2.PI-.0=PI,RC1-.0=A);
  U1.7(U1.Z-.7=Z,U1.PO-.7=PO) = &TLCHTU(U1.PI-.7=PI,RC0-.7=A);
  U1.6(U1.Z-.6=Z,U1.PO-.6=PO) = &TLCHTU(U1.PI-.6=PI,RC0-.6=A);
  U1.5(U1.Z-.5=Z,U1.PO-.5=PO) = &TLCHTU(U1.PI-.5=PI,RC0-.5=A);
  U1.4(U1.Z-.4=Z,U1.PO-.4=PO) = &TLCHTU(U1.PI-.4=PI,RC0-.4=A);
  U1.3(U1.Z-.3=Z,U1.PO-.3=PO) = &TLCHTU(U1.PI-.3=PI,RC0-.3=A);
  U1.2(U1.Z-.2=Z,U1.PO-.2=PO) = &TLCHTU(U1.PI-.2=PI,RC0-.2=A);
  U1.1(U1.Z-.1=Z,U1.PO-.1=PO) = &TLCHTU(U1.PI-.1=PI,RC0-.1=A);
  U1.0(U1.Z-.0=Z,U1.PO-.0=PO) = &TLCHTU(U1.PI-.0=PI,RC0-.0=A);
  U30.2(U30.Z-.2=Z,U30.PO-.2=PO) = &TLCHTU(COF_ADRIN-.2=A,
          U30.PI-.2=PI);
```

```
U30.1(U30.Z-.1=Z,U30.PO-.1=PO) = &TLCHTU(COF_ADRIN-.1=A,
       U30.PI-.1=PI);
U30.0(U30.Z-.0=Z,U30.PO-.0=PO) = &TLCHTU(COF_ADRIN-.0=A,
       U30.PI-.0=PI);
U31(U31.PO-=PO,U31.Z-=Z) = &TLCHTU(INT_GT_1IN-=A,U32.PO-=PI);
U6(U6.Z-=Z,U6.PO-=PO) = &TLCHTU(STRT-=A,U6.PI-=PI);
U7(U7.Z-=Z,U7.PO-=PO) = &TLCHTU(U6.PO-=PI,STOP-=A);
U8(U8.Z-=Z,U8.PO-=PO) = &TLCHTU(WAIT-=A,U7.PO-=PI);
U10(U10.Z-=Z,U10.PO-=PO) = &TLCHTU(ALE-=A,U10.PI-=PI);
U11(U11.Z-=Z,U11.PO-=PO) = &TLCHTU(U10.PO-=PI,RD_-=A);
U12(U12.Z-=Z,U12.PO-=PO) = &TLCHTU(WR_-=A,U11.PO-=PI);
U13(U13.Z-=Z,U13.PO-=PO) = &TLCHTU(U12.PO-=PI,CS_-=A);
U14(U14.Z-=Z,U14.PO-=PO) = &TLCHTU(U13.PO-=PI,RDY_I-=A);
U33(U33.PO-=PO,U33.Z-=Z) = &TLCHTU(YUP-=A,U33.PI-=PI);
U28.15(U28.ZI-.15=ZI,U28.PO-.15=PO,MPD-.15=IO) = &BD6TU(
       U0.MPD_OE_-=EN,U0.PDO-.15=A,U28.TN-=TN,U28.PI-.15=PI);
U28.14(U28.ZI-.14=ZI,U28.PO-.14=PO,MPD-.14=IO) = &BD6TU(
       U0.MPD_OE_-=EN,U0.PDO-.14=A,U28.TN-=TN,U28.PI-.14=PI);
U28.13(U28.ZI-.13=ZI,U28.PO-.13=PO,MPD-.13=IO) = &BD6TU(
       U0.MPD_OE_-=EN,U0.PDO-.13=A,U28.TN-=TN,U28.PI-.13=PI);
U28.12(U28.ZI-.12=ZI,U28.PO-.12=PO,MPD-.12=IO) = &BD6TU(
       U0.MPD_OE_-=EN,U0.PDO-.12=A,U28.TN-=TN,U28.PI-.12=PI);
U28.11(U28.ZI-.11=ZI,U28.PO-.11=PO,MPD-.11=IO) = &BD6TU(
       U0.MPD_OE_-=EN,U0.PDO-.11=A,U28.TN-=TN,U28.PI-.11=PI);
U28.10(U28.ZI-.10=ZI,U28.PO-.10=PO,MPD-.10=IO) = &BD6TU(
       U0.MPD_OE_-=EN,U0.PDO-.10=A,U28.TN-=TN,U28.PI-.10=PI);
U28.9(U28.ZI-.9=ZI,U28.PO-.9=PO,MPD-.9=IO) = &BD6TU(U0.MPD_OE_-=EN,
       U0.PDO-.9=A,U28.TN-=TN,U28.PI-.9=PI);
U28.8(U28.ZI-.8=ZI,U28.PO-.8=PO,MPD-.8=IO) = &BD6TU(U0.MPD_OE_-=EN,
       U0.PDO-.8=A,U28.TN-=TN,U28.PI-.8=PI);
U28.7(U28.ZI-.7=ZI,U28.PO-.7=PO,MPD-.7=IO) = &BD6TU(U0.MPD_OE_-=EN,
       U0.PDO-.7=A,U28.TN-=TN,U28.PI-.7=PI);
U28.6(U28.ZI-.6=ZI,U28.PO-.6=PO,MPD-.6=IO) = &BD6TU(U0.MPD_OE_-=EN,
       U0.PDO-.6=A,U28.TN-=TN,U28.PI-.6=PI);
U28.5(U28.ZI-.5=ZI,U28.PO-.5=PO,MPD-.5=IO) = &BD6TU(U0.MPD_OE_-=EN,
       U0.PDO-.5=A,U28.TN-=TN,U28.PI-.5=PI);
U28.4(U28.ZI-.4=ZI,U28.PO-.4=PO,MPD-.4=IO) = &BD6TU(U0.MPD_OE_-=EN,
       U0.PDO-.4=A,U28.TN-=TN,U28.PI-.4=PI);
U28.3(U28.ZI-.3=ZI,U28.PO-.3=PO,MPD-.3=IO) = &BD6TU(U0.MPD_OE_-=EN,
       U0.PDO-.3=A,U28.TN-=TN,U28.PI-.3=PI);
U28.2(U28.ZI-.2=ZI,U28.PO-.2=PO,MPD-.2=IO) = &BD6TU(U0.MPD_OE_-=EN,
       U0.PDO-.2=A,U28.TN-=TN,U28.PI-.2=PI);
U28.1(U28.ZI-.1=ZI,U28.PO-.1=PO,MPD-.1=IO) = &BD6TU(U0.MPD_OE_-=EN,
       U0.PDO-.1=A,U28.TN-=TN,U28.PI-.1=PI);
U28.0(U28.ZI-.0=ZI,U28.PO-.0=PO,MPD-.0=IO) = &BD6TU(U0.MPD_OE_-=EN,
       U0.PDO-.0=A,U28.TN-=TN,U28.PI-.0=PI);
U29(PTST-=Z) = &B4RP(U29.A-=A);
U20(U20.Z-=Z,U20.PO-=PO) = &DRVT4U(U19.PO-=PI,RESET_-=A);
U19(U19.Z-=Z,U19.PO-=PO) = &DRVT8U(U18.PO-=PI,CP-=A);
U18(U18.Z-=Z,U18.PO-=PO) = &TLCHTU(U17.PO-=PI,YSCNIN-=A);
U17(U17.Z-=Z,U17.PO-=PO) = &TLCHTU(U16.PO-=PI,XSCNIN-=A);
U16(U16.Z-=Z,U16.PO-=PO) = &TLCHTU(U15.PO-=PI,TST-=A);
U15(U15.PO-=PO,U15.Z-=Z) = &TLCHTU(U14.PO-=PI,PXL_EN-=A);
U0(U0.BMYL-.4=BMYL.4,U0.BMYL-.3=BMYL.3,U0.BMYL-.2=BMYL.2,
       U0.BMYL-.1=BMYL.1,U0.BMYL-.0=BMYL.0,U0.REQ_O-=REQ_O,
       U0.CNVL-.12=CNVL.12,U0.CNVL-.11=CNVL.11,U0.CNVL-.10=CNVL.10,
       U0.CNVL-.9=CNVL.9,U0.CNVL-.8=CNVL.8,U0.CNVL-.7=CNVL.7,
       U0.CNVL-.6=CNVL.6,U0.CNVL-.5=CNVL.5,U0.CNVL-.4=CNVL.4,
       U0.CNVL-.3=CNVL.3,U0.CNVL-.2=CNVL.2,U0.CNVL-.1=CNVL.1,
       U0.CNVL-.0=CNVL.0,U0.YINT-=YINT,U0.YINTSND-=YINTSND,
       U0.REQ_I-=REQ_I,U0.STB_I-=STB_I,U0.MPD_OE_-=MPD_OE_,
       U0.PDO-.15=PDO.15,U0.PDO-.14=PDO.14,U0.PDO-.13=PDO.13,
       U0.PDO-.12=PDO.12,U0.PDO-.11=PDO.11,U0.PDO-.10=PDO.10,
       U0.PDO-.9=PDO.9,U0.PDO-.8=PDO.8,U0.PDO-.7=PDO.7,
       U0.PDO-.6=PDO.6,U0.PDO-.5=PDO.5,U0.PDO-.4=PDO.4,
       U0.PDO-.3=PDO.3,U0.PDO-.2=PDO.2,U0.PDO-.1=PDO.1,
       U0.PDO-.0=PDO.0,U0.CLRXCNT_-=CLRXCNT_) = SPTTOPV2(
       U30.Z-.2=COF_ADRIN.2,U30.Z-.1=COF_ADRIN.1,U30.Z-.0=COF_ADRIN.0,
       U31.Z-=INT_GT_1IN,U32.Z-=YDWN,U33.Z-=YUP,U1.Z-.7=RC0.7,
       U1.Z-.6=RC0.6,U1.Z-.5=RC0.5,U1.Z-.4=RC0.4,U1.Z-.3=RC0.3,
       U1.Z-.2=RC0.2,U1.Z-.1=RC0.1,U1.Z-.0=RC0.0,U2.Z-.7=RC1.7,
       U2.Z-.6=RC1.6,U2.Z-.5=RC1.5,U2.Z-.4=RC1.4,U2.Z-.3=RC1.3,
       U2.Z-.2=RC1.2,U2.Z-.1=RC1.1,U2.Z-.0=RC1.0,U21.Z-.7=RC2.7,
       U21.Z-.6=RC2.6,U21.Z-.5=RC2.5,U21.Z-.4=RC2.4,U21.Z-.3=RC2.3,
       U21.Z-.2=RC2.2,U21.Z-.1=RC2.1,U21.Z-.0=RC2.0,U3.Z-.7=RC3.7,
```

```
        U3.Z-.6=RC3.6,U3.Z-.5=RC3.5,U3.Z-.4=RC3.4,U3.Z-.3=RC3.3,
        U3.Z-.2=RC3.2,U3.Z-.1=RC3.1,U3.Z-.0=RC3.0,U4.Z-.7=RC4.7,
        U4.Z-.6=RC4.6,U4.Z-.5=RC4.5,U4.Z-.4=RC4.4,U4.Z-.3=RC4.3,
        U4.Z-.2=RC4.2,U4.Z-.1=RC4.1,U4.Z-.0=RC4.0,U6.Z-=STRT,
        U7.Z-=STOP,U8.Z-=WAIT,U9.Z-.7=MPA.7,U9.Z-.6=MPA.6,
        U9.Z-.5=MPA.5,U9.Z-.4=MPA.4,U9.Z-.3=MPA.3,U9.Z-.2=MPA.2,
        U9.Z-.1=MPA.1,U9.Z-.0=MPA.0,U10.Z-=ALE,U11.Z-=RD_,
        U12.Z-=WR_,U13.Z-=CS_,U14.Z-=RDY_I,U16.Z-=TST,U17.Z-=XSCNIN,
        U18.Z-=YSCNIN,U19.Z-=CP,U28.ZI-.15=PDI.15,U28.ZI-.14=PDI.14,
        U28.ZI-.13=PDI.13,U28.ZI-.12=PDI.12,U28.ZI-.11=PDI.11,
        U28.ZI-.10=PDI.10,U28.ZI-.9=PDI.9,U28.ZI-.8=PDI.8,
        U28.ZI-.7=PDI.7,U28.ZI-.6=PDI.6,U28.ZI-.5=PDI.5,
        U28.ZI-.4=PDI.4,U28.ZI-.3=PDI.3,U28.ZI-.2=PDI.2,
        U28.ZI-.1=PDI.1,U28.ZI-.0=PDI.0,U20.Z-=RESET_,U15.Z-=PXL_EN);
 U32(U32.PO-=PO,U32.Z-=Z) = &TLCHTU(YDWN-=A,U33.PO-=PI);


/* extractors ******************************/

 U30.PI-.0 = (U31.PO-);
 U30.PI-.1 = (M-0.1);
 U30.PI-.2 = (M-0.0);
 U30.PO-.0 = (M-0.1);
 U30.PO-.1 = (M-0.0);
 U30.PO-.2 = (M-1);
 U1.PI-.0 = (M-1);
 U1.PI-.1 = (M-2.6);
 U1.PI-.2 = (M-2.5);
 U1.PI-.3 = (M-2.4);
 U1.PI-.4 = (M-2.3);
 U1.PI-.5 = (M-2.2);
 U1.PI-.6 = (M-2.1);
 U1.PI-.7 = (M-2.0);
 U1.PO-.0 = (M-2.6);
 U1.PO-.1 = (M-2.5);
 U1.PO-.2 = (M-2.4);
 U1.PO-.3 = (M-2.3);
 U1.PO-.4 = (M-2.2);
 U1.PO-.5 = (M-2.1);
 U1.PO-.6 = (M-2.0);
 U1.PO-.7 = (M-3);
 U2.PI-.0 = (M-3);
 U2.PI-.1 = (M-4.6);
 U2.PI-.2 = (M-4.5);
 U2.PI-.3 = (M-4.4);
 U2.PI-.4 = (M-4.3);
 U2.PI-.5 = (M-4.2);
 U2.PI-.6 = (M-4.1);
 U2.PI-.7 = (M-4.0);
 U2.PO-.0 = (M-4.6);
 U2.PO-.1 = (M-4.5);
 U2.PO-.2 = (M-4.4);
 U2.PO-.3 = (M-4.3);
 U2.PO-.4 = (M-4.2);
 U2.PO-.5 = (M-4.1);
 U2.PO-.6 = (M-4.0);
 U2.PO-.7 = (M-5);
 U21.PI-.0 = (M-5);
 U21.PI-.1 = (M-6.6);
 U21.PI-.2 = (M-6.5);
 U21.PI-.3 = (M-6.4);
 U21.PI-.4 = (M-6.3);
 U21.PI-.5 = (M-6.2);
 U21.PI-.6 = (M-6.1);
 U21.PI-.7 = (M-6.0);
 U21.PO-.0 = (M-6.6);
 U21.PO-.1 = (M-6.5);
 U21.PO-.2 = (M-6.4);
 U21.PO-.3 = (M-6.3);
 U21.PO-.4 = (M-6.2);
 U21.PO-.5 = (M-6.1);
 U21.PO-.6 = (M-6.0);
 U21.PO-.7 = (M-7);
 U3.PI-.0 = (M-7);
 U3.PI-.1 = (M-8.6);
```

```
U3.PI-.2 = (M-8.5);
U3.PI-.3 = (M-8.4);
U3.PI-.4 = (M-8.3);
U3.PI-.5 = (M-8.2);
U3.PI-.6 = (M-8.1);
U3.PI-.7 = (M-8.0);
U3.PO-.0 = (M-8.6);
U3.PO-.1 = (M-8.5);
U3.PO-.2 = (M-8.4);
U3.PO-.3 = (M-8.3);
U3.PO-.4 = (M-8.2);
U3.PO-.5 = (M-8.1);
U3.PO-.6 = (M-8.0);
U3.PO-.7 = (M-9);
U4.PI-.0 = (M-9);
U4.PI-.1 = (M-10.6);
U4.PI-.2 = (M-10.5);
U4.PI-.3 = (M-10.4);
U4.PI-.4 = (M-10.3);
U4.PI-.5 = (M-10.2);
U4.PI-.6 = (M-10.1);
U4.PI-.7 = (M-10.0);
U4.PO-.0 = (M-10.6);
U4.PO-.1 = (M-10.5);
U4.PO-.2 = (M-10.4);
U4.PO-.3 = (M-10.3);
U4.PO-.4 = (M-10.2);
U4.PO-.5 = (M-10.1);
U4.PO-.6 = (M-10.0);
U4.PO-.7 = (U6.PI-);
U9.PI-.0 = (U8.PO-);
U9.PI-.1 = (M-11.6);
U9.PI-.2 = (M-11.5);
U9.PI-.3 = (M-11.4);
U9.PI-.4 = (M-11.3);
U9.PI-.5 = (M-11.2);
U9.PI-.6 = (M-11.1);
U9.PI-.7 = (M-11.0);
U9.PO-.0 = (M-11.6);
U9.PO-.1 = (M-11.5);
U9.PO-.2 = (M-11.4);
U9.PO-.3 = (M-11.3);
U9.PO-.4 = (M-11.2);
U9.PO-.5 = (M-11.1);
U9.PO-.6 = (M-11.0);
U9.PO-.7 = (U10.PI-);
U28.PO-.15 = (U29.A-);
U28.PO-.0 = (M-12.14);
U28.PO-.1 = (M-12.13);
U28.PO-.2 = (M-12.12);
U28.PO-.3 = (M-12.11);
U28.PO-.4 = (M-12.10);
U28.PO-.5 = (M-12.9);
U28.PO-.6 = (M-12.8);
U28.PO-.7 = (M-12.7);
U28.PO-.8 = (M-12.6);
U28.PO-.9 = (M-12.5);
U28.PO-.10 = (M-12.4);
U28.PO-.11 = (M-12.3);
U28.PO-.12 = (M-12.2);
U28.PO-.13 = (M-12.1);
U28.PO-.14 = (M-12.0);
U28.PI-.1 = (M-12.14);
U28.PI-.2 = (M-12.13);
U28.PI-.3 = (M-12.12);
U28.PI-.4 = (M-12.11);
U28.PI-.5 = (M-12.10);
U28.PI-.6 = (M-12.9);
U28.PI-.7 = (M-12.8);
U28.PI-.8 = (M-12.7);
U28.PI-.9 = (M-12.6);
U28.PI-.10 = (M-12.5);
U28.PI-.11 = (M-12.4);
U28.PI-.12 = (M-12.3);
U28.PI-.13 = (M-12.2);
```

```
    U28.PI-.14 = (M-12.1);
    U28.PI-.15 = (M-12.0);
    U28.PI-.0 = (U20.PO-);

  /* type converters *********************/

ANNOTATIONS
{
  BUS BUS_TYPE = "DOT";
}

END MODULE;


/* * * * * * *  Contents of NET file ADD8F_SEL4.NET  * * * * * * */

/*****************************************************/
/*  Netlist copyright (C) 1989 LSI Logiç Corporation  */
/*****************************************************/


MODULE ADD8F_SEL4;

INPUTS      A0,A1,A2,A3,B0,B1,B2,B3,CI;
OUTPUTS     G,P,SUM0,SUM1,SUM2,SUM3;

LEVEL FUNCTION;
DEFINE
  /* implicit connectors *******************/

    P- = (P);
    SUM3- = (SUM3);
    A2- = (A2);
    B2- = (B2);
    G- = (G);
    B3- = (B3);
    A3- = (A3);
    A1- = (A1);
    B1- = (B1);
    SUM1- = (SUM1);
    CI- = (CI);
    SUM2- = (SUM2);
    A0- = (A0);
    B0- = (B0);
    SUM0- = (SUM0);


  /* part instances **************************/

    U28(U28.Z-=Z) = N1C(U18.Z-=A);
    U30(U30.Z-=Z) = ENB(U11.Z-=A,U25.Z-=B);
    U40(P-=Z) = AND2B(U19.Z-=B,U3.Z-=A);
    U26(U26.Z-=Z) = EOB(U9.Z-=A,U16.Z-=B);
    U37(U37.Z-=Z) = MX21LA(U15.Z-=S,U27.Z-=B,U26.Z-=A);
    U39(SUM3-=Z) = MX21LB(U36.Z-=A,U37.Z-=B,U29.Z-=S);
    U36(U36.Z-=Z) = MX21LA(U27.Z-=B,U26.Z-=A,U4.Z-=S);
    U27(U27.Z-=Z) = ENB(U16.Z-=A,U10.Z-=B);
    U35(U35.Z-=Z) = MX21LA(U15.Z-=S,U24.Z-=A,U14.Z-=B);
    U24(U24.Z-=Z) = N1B(U14.Z-=A);
    U14(U14.Z-=Z) = ND2B(U10.Z-=B,U9.Z-=A);
    U10(U10.Z-=Z) = N1B(U7.Z-=A);
    U7(U7.Z-=Z) = NR2C(B2-=B,A2-=A);
    U9(U9.Z-=Z) = ND2C(A2-=A,B2-=B);
    U23(G-=Z) = ND2C(U21.Z-=B,U22.Z-=A);
    U21(U21.Z-=Z) = N1C(U20.Z-=A);
    U20(U20.Z-=Z) = AO7A(U8.Z-=B,U9.Z-=A,U13.Z-=C);
    U8(U8.Z-=Z) = NR2C(B3-=B,A3-=A);
    U13(U13.Z-=Z) = ND2C(A3-=A,B3-=B);
    U16(U16.Z-=Z) = ND2C(U13.Z-=A,U17.Z-=B);
    U17(U17.Z-=Z) = N1B(U8.Z-=A);
    U19(U19.Z-=Z) = NR2C(U7.Z-=A,U8.Z-=B);
    U22(U22.Z-=Z) = ND2B(U15.Z-=B,U19.Z-=A);
```

```
   U15(U15.Z-=Z) = AO7B(U11.Z-=A,U5.Z-=B,U12.Z-=C);
   U2(U2.Z-=Z) = N1B(U5.Z-=A);
   U5(U5.Z-=Z) = NR2C(B1-=B,A1-=A);
   U12(U12.Z-=Z) = ND2C(A1-=A,B1-=B);
   U25(U25.Z-=Z) = ND2B(U2.Z-=B,U12.Z-=A);
   U1(U1.Z-=Z) = N1B(U0.Z-=A);
   U31(U31.Z-=Z) = EOB(U25.Z-=A,U1.Z-=B);
   U34(SUM1-=Z) = MX21LB(U30.Z-=B,U31.Z-=A,U29.Z-=S);
   U29(U29.Z-=Z) = N1D(CI-=A);
   U38(SUM2-=Z) = MX21LB(U35.Z-=B,U32.Z-=A,U29.Z-=S);
   U32(U32.Z-=Z) = MX21LA(U24.Z-=A,U14.Z-=B,U4.Z-=S);
   U4(U4.Z-=Z) = ND2C(U12.Z-=A,U6.Z-=B);
   U6(U6.Z-=Z) = N1C(U3.Z-=A);
   U3(U3.Z-=Z) = NR2C(U0.Z-=B,U5.Z-=A);
   U0(U0.Z-=Z) = NR2C(B0-=B,A0-=A);
   U11(U11.Z-=Z) = ND2C(A0-=A,B0-=B);
   U18(U18.Z-=Z) = ND2B(U1.Z-=B,U11.Z-=A);
   U33(SUM0-=Z) = MX21LB(U28.Z-=A,U29.Z-=S,U18.Z-=B);

  /* extractors ******************************/


  /* type converters *********************/

ANNOTATIONS
{
  BUS BUS_TYPE = "DOT";
}

END MODULE;

/* * * * * * *  Contents of NET file ADD8F.NET  * * * * * * */

/******************************************************/
/*  Netlist copyright (C) 1989 LSI Logic Corporation  */
/******************************************************/


MODULE ADD8F;

INPUTS      A.7,A.6,A.5,A.4,A.3,A.2,A.1,A.0,B.7,B.6,B.5,B.4,B.3,
            B.2,B.1,B.0,CI;
OUTPUTS     S.7,S.6,S.5,S.4,S.3,S.2,S.1,S.0;

LEVEL FUNCTION;
DEFINE
  /* implicit connectors *******************/

    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    CI- = (CI);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
```

```
/* part instances ***************************/

  U4(U4.Z-=Z) = N1D(U3.Z-=A);
  U3(U3.Z-=Z) = AO6B(CI-=A,U0.G-=C,U0.P-=B);
  U0(U0.G-=G,U0.P-=P,U0.SUM0-=SUM0,U0.SUM1-=SUM1,U0.SUM2-=SUM2,
          U0.SUM3-=SUM3) = ADD8F_SEL4(CI-=CI,U0.A0-=A0,U0.A1-=A1,
          U0.A2-=A2,U0.A3-=A3,U0.B0-=B0,U0.B1-=B1,U0.B2-=B2,
          U0.B3-=B3);
  U8(U8.Z-=Z) = ND3C(CI-=A,U1.P-=C,U0.P-=B);
  U5(U5.Z-=Z) = ND2C(U2.Z-=A,U8.Z-=B);
  U2(U2.Z-=Z) = AO6B(U0.G-=A,U1.P-=B,U1.G-=C);
  U6(U6.Z-=Z) = AO6B(U5.Z-=A,U1.P-=B,U1.G-=C);
  U7(U7.Z-=Z) = N1C(U6.Z-=A);
  U1(U1.P-=P,U1.G-=G,U1.SUM0-=SUM0,U1.SUM1-=SUM1,U1.SUM3-=SUM3,
          U1.SUM2-=SUM2) = ADD8F_SEL4(U1.A1-=A1,U1.A0-=A0,U1.A2-=A2,
          U1.A3-=A3,U1.B0-=B0,U4.Z-=CI,U1.B1-=B1,U1.B3-=B3,
          U1.B2-=B2);


/* extractors ******************************/

  B-.4 = (U1.B0-);
  B-.5 = (U1.B1-);
  M-1.7 = (U1.SUM3-);
  M-1.5 = (U1.SUM1-);
  A-.0 = (U0.A0-);
  A-.6 = (U1.A2-);
  A-.4 = (U1.A0-);
  A-.2 = (U0.A2-);
  A-.5 = (U1.A1-);
  A-.1 = (U0.A1-);
  A-.7 = (U1.A3-);
  A-.3 = (U0.A3-);
  M-1.0 = (U0.SUM0-);
  B-.0 = (U0.B0-);
  M-1.1 = (U0.SUM1-);
  B-.1 = (U0.B1-);
  M-1.2 = (U0.SUM2-);
  B-.2 = (U0.B2-);
  M-1.3 = (U0.SUM3-);
  B-.3 = (U0.B3-);
  S-.7 = (U7.Z-);
  S-.6 = (M-0.6);
  S-.5 = (M-0.5);
  S-.4 = (M-0.4);
  S-.3 = (M-0.3);
  S-.2 = (M-0.2);
  S-.1 = (M-0.1);
  S-.0 = (M-0.0);
  M-1.7 = (M-0.6);
  M-1.6 = (M-0.5);
  M-1.5 = (M-0.4);
  M-1.4 = (M-0.3);
  M-1.3 = (M-0.2);
  M-1.2 = (M-0.1);
  M-1.1 = (M-0.0);
  M-1.4 = (U1.SUM0-);
  M-1.6 = (U1.SUM2-);
  B-.6 = (U1.B2-);
  B-.7 = (U1.B3-);


   /* type converters *********************/

  ANNOTATIONS
  {
    BUS BUS_TYPE = "DOT";
  }

  END MODULE;


  /* * * * * * *  Contents of NET file FRMLV2.NET  * * * * * * * */
```

```
/*****************************************************/
/*  Netlist copyright (C) 1989 LSI Logic Corporation  */
/*****************************************************/


MODULE FRMLV2;

INPUTS      CP,CT.7,CT.6,CT.5,CT.4,CT.3,CT.2,CT.1,CT.0,LWS.7,
            LWS.6,LWS.5,LWS.4,LWS.3,LWS.2,LWS.1,LWS.0,RESET_,SC.7,
            SC.6,SC.5,SC.4,SC.3,SC.2,SC.1,SC.0,WAIT;
OUTPUTS     Z.7,Z.6,Z.5,Z.4,Z.3,Z.2,Z.1,Z.0;

LEVEL FUNCTION;
DEFINE
  /* implicit connectors *******************/

    Z-.7 = (Z.7);
    Z-.6 = (Z.6);
    Z-.5 = (Z.5);
    Z-.4 = (Z.4);
    Z-.3 = (Z.3);
    Z-.2 = (Z.2);
    Z-.1 = (Z.1);
    Z-.0 = (Z.0);
    CT-.7 = (CT.7);
    CT-.6 = (CT.6);
    CT-.5 = (CT.5);
    CT-.4 = (CT.4);
    CT-.3 = (CT.3);
    CT-.2 = (CT.2);
    CT-.1 = (CT.1);
    CT-.0 = (CT.0);
    SC-.7 = (SC.7);
    SC-.6 = (SC.6);
    SC-.5 = (SC.5);
    SC-.4 = (SC.4);
    SC-.3 = (SC.3);
    SC-.2 = (SC.2);
    SC-.1 = (SC.1);
    SC-.0 = (SC.0);
    LWS-.7 = (LWS.7);
    LWS-.6 = (LWS.6);
    LWS-.5 = (LWS.5);
    LWS-.4 = (LWS.4);
    LWS-.3 = (LWS.3);
    LWS-.2 = (LWS.2);
    LWS-.1 = (LWS.1);
    LWS-.0 = (LWS.0);
    U5.CI- = (NC/0/);
    U4.TCX- = (NC/0/);
    U4.TCYN- = (NC/1/);
    CP- = (CP);
    CP- = (CP);
    BRESET_- = (BRESET_);
    WAIT- = (WAIT);
    WAIT- = (WAIT);
    BRESET_- = (BRESET_);
    BRESET_- = (BRESET_);
    RESET_- = (RESET_);


  /* part instances **************************/

    U5(U5.S-.7=S.7,U5.S-.6=S.6,U5.S-.5=S.5,U5.S-.4=S.4,U5.S-.3=S.3,
           U5.S-.2=S.2,U5.S-.1=S.1,U5.S-.0=S.0) = ADD8F(U5.B-.7=B.7,
           U5.B-.6=B.6,U5.B-.5=B.5,U5.B-.4=B.4,U5.B-.3=B.3,
           U5.B-.2=B.2,U5.B-.1=B.1,U5.B-.0=B.0,U5.CI-=CI,U5.A-.7=A.7,
           U5.A-.6=A.6,U5.A-.5=A.5,U5.A-.4=A.4,U5.A-.3=A.3,
           U5.A-.2=A.2,U5.A-.1=A.1,U5.A-.0=A.0);
    U4(U4.S-.16=S.16,U4.S-.15=S.15,U4.S-.14=S.14,U4.S-.13=S.13,
           U4.S-.12=S.12,U4.S-.11=S.11,U4.S-.10=S.10,U4.S-.9=S.9,
           U4.S-.8=S.8,U4.S-.7=S.7,U4.S-.6=S.6,U4.S-.5=S.5,
           U4.S-.4=S.4,U4.S-.3=S.3,U4.S-.2=S.2,U4.S-.1=S.1,
           U4.S-.0=S.0) = DMB2001B(U4.TCX-=TCX,U4.TCYN-=TCYN,
```

```
        U4.X-.7=X.7,U4.X-.6=X.6,U4.X-.5=X.5,U4.X-.4=X.4,
        U4.X-.3=X.3,U4.X-.2=X.2,U4.X-.1=X.1,U4.X-.0=X.0,
        U4.Y-.7=Y.7,U4.Y-.6=Y.6,U4.Y-.5=Y.5,U4.Y-.4=Y.4,
        U4.Y-.3=Y.3,U4.Y-.2=Y.2,U4.Y-.1=Y.1,U4.Y-.0=Y.0);
U0.2.7(U0.Q-.2.7=Q) = FD2SA(U0.D-.2.7=D,U0.Q-.2.7=TI,CP-=CP,
        BRESET_-=CD,WAIT-=TE);
U0.2.6(U0.Q-.2.6=Q) = FD2SA(U0.D-.2.6=D,U0.Q-.2.6=TI,CP-=CP,
        BRESET_-=CD,WAIT-=TE);
U0.2.5(U0.Q-.2.5=Q) = FD2SA(U0.D-.2.5=D,U0.Q-.2.5=TI,CP-=CP,
        BRESET_-=CD,WAIT-=TE);
U0.2.4(U0.Q-.2.4=Q) = FD2SA(U0.D-.2.4=D,U0.Q-.2.4=TI,CP-=CP,
        BRESET_-=CD,WAIT-=TE);
U0.2.3(U0.Q-.2.3=Q) = FD2SA(U0.D-.2.3=D,U0.Q-.2.3=TI,CP-=CP,
        BRESET_-=CD,WAIT-=TE);
U0.2.2(U0.Q-.2.2=Q) = FD2SA(U0.D-.2.2=D,U0.Q-.2.2=TI,CP-=CP,
        BRESET_-=CD,WAIT-=TE);
U0.2.1(U0.Q-.2.1=Q) = FD2SA(U0.D-.2.1=D,U0.Q-.2.1=TI,CP-=CP,
        BRESET -=CD,WAIT-=TE);
U0.2.0(U0.Q-.2.0=Q) = FD2SA(U0.D-.2.0=D,U0.Q-.2.0=TI,CP-=CP,
        BRESET_-=CD,WAIT-=TE);
U0.1.7(U0.Q-.1.7=Q) = FD2SA(U0.D-.1.7=D,U0.Q-.1.7=TI,CP-=CP,
        BRESET_-=CD,WAIT-=TE);
U0.1.6(U0.Q-.1.6=Q) = FD2SA(U0.D-.1.6=D,U0.Q-.1.6=TI,CP-=CP,
        BRESET_-=CD,WAIT-=TE);
U0.1.5(U0.Q-.1.5=Q) = FD2SA(U0.D-.1.5=D,U0.Q-.1.5=TI,CP-=CP,
        BRESET_-=CD,WAIT-=TE);
U0.1.4(U0.Q-.1.4=Q) = FD2SA(U0.D-.1.4=D,U0.Q-.1.4=TI,CP-=CP,
        BRESET_-=CD,WAIT-=TE);
U0.1.3(U0.Q-.1.3=Q) = FD2SA(U0.D-.1.3=D,U0.Q-.1.3=TI,CP-=CP,
        BRESET_-=CD,WAIT-=TE);
U0.1.2(U0.Q-.1.2=Q) = FD2SA(U0.D-.1.2=D,U0.Q-.1.2=TI,CP-=CP,
        BRESET_-=CD,WAIT-=TE);
U0.1.1(U0.Q-.1.1=Q) = FD2SA(U0.D-.1.1=D,U0.Q-.1.1=TI,CP-=CP,
        BRESET_-=CD,WAIT-=TE);
U0.1.0(U0.Q-.1.0=Q) = FD2SA(U0.D-.1.0=D,U0.Q-.1.0=TI,CP-=CP,
        BRESET_-=CD,WAIT-=TE);
U0.0.7(U0.Q-.0.7=Q) = FD2SA(U0.D-.0.7=D,U0.Q-.0.7=TI,CP-=CP,
        BRESET_-=CD,WAIT-=TE);
U0.0.6(U0.Q-.0.6=Q) = FD2SA(U0.D-.0.6=D,U0.Q-.0.6=TI,CP-=CP,
        BRESET_-=CD,WAIT-=TE);
U0.0.5(U0.Q-.0.5=Q) = FD2SA(U0.D-.0.5=D,U0.Q-.0.5=TI,CP-=CP,
        BRESET_-=CD,WAIT-=TE);
U0.0.4(U0.Q-.0.4=Q) = FD2SA(U0.D-.0.4=D,U0.Q-.0.4=TI,CP-=CP,
        BRESET_-=CD,WAIT-=TE);
U0.0.3(U0.Q-.0.3=Q) = FD2SA(U0.D-.0.3=D,U0.Q-.0.3=TI,CP-=CP,
        BRESET_-=CD,WAIT-=TE);
U0.0.2(U0.Q-.0.2=Q) = FD2SA(U0.D-.0.2=D,U0.Q-.0.2=TI,CP-=CP,
        BRESET_-=CD,WAIT-=TE);
U0.0.1(U0.Q-.0.1=Q) = FD2SA(U0.D-.0.1=D,U0.Q-.0.1=TI,CP-=CP,
        BRESET_-=CD,WAIT-=TE);
U0.0.0(U0.Q-.0.0=Q) = FD2SA(U0.D-.0.0=D,U0.Q-.0.0=TI,CP-=CP,
        BRESET_-=CD,WAIT-=TE);
U6.7(Z-.7=Q) = FD2SA(Z-.7=TI,CP-=CP,U5.S-.7=D,BRESET_-=CD,WAIT-=TE);
U6.6(Z-.6=Q) = FD2SA(Z-.6=TI,CP-=CP,U5.S-.6=D,BRESET_-=CD,WAIT-=TE);
U6.5(Z-.5=Q) = FD2SA(Z-.5=TI,CP-=CP,U5.S-.5=D,BRESET_-=CD,WAIT-=TE);
U6.4(Z-.4=Q) = FD2SA(Z-.4=TI,CP-=CP,U5.S-.4=D,BRESET_-=CD,WAIT-=TE);
U6.3(Z-.3=Q) = FD2SA(Z-.3=TI,CP-=CP,U5.S-.3=D,BRESET_-=CD,WAIT-=TE);
U6.2(Z-.2=Q) = FD2SA(Z-.2=TI,CP-=CP,U5.S-.2=D,BRESET_-=CD,WAIT-=TE);
U6.1(Z-.1=Q) = FD2SA(Z-.1=TI,CP-=CP,U5.S-.1=D,BRESET_-=CD,WAIT-=TE);
U6.0(Z-.0=Q) = FD2SA(Z-.0=TI,CP-=CP,U5.S-.0=D,BRESET_-=CD,WAIT-=TE);
U3(BRESET_-=Z) = B3A(RESET_-=A);


/* extractors *******************************/

 U0.D-.2.7 = (CT-.7);
 U0.D-.2.6 = (CT-.6);
 U0.D-.2.5 = (CT-.5);
 U0.D-.2.4 = (CT-.4);
 U0.D-.2.3 = (CT-.3);
 U0.D-.2.2 = (CT-.2);
 U0.D-.2.1 = (CT-.1);
 U0.D-.2.0 = (CT-.0);
 U0.D-.1.7 = (SC-.7);
```

```
    U0.D-.1.6 = (SC-.6);
    U0.D-.1.5 = (SC-.5);
    U0.D-.1.4 = (SC-.4);
    U0.D-.1.3 = (SC-.3);
    U0.D-.1.2 = (SC-.2);
    U0.D-.1.1 = (SC-.1);
    U0.D-.1.0 = (SC-.0);
    U0.D-.0.7 = (LWS-.7);
    U0.D-.0.6 = (LWS-.6);
    U0.D-.0.5 = (LWS-.5);
    U0.D-.0.4 = (LWS-.4);
    U0.D-.0.3 = (LWS-.3);
    U0.D-.0.2 = (LWS-.2);
    U0.D-.0.1 = (LWS-.1);
    U0.D-.0.0 = (LWS-.0);
    U4.S-.15 = (U5.B-.7);
    U4.S-.14 = (U5.B-.6);
    U4.S-.13 = (U5.B-.5);
    U4.S-.12 = (U5.B-.4);
    U4.S-.11 = (U5.B-.3);
    U4.S-.10 = (U5.B-.2);
    U4.S-.9 = (U5.B-.1);
    U4.S-.8 = (U5.B-.0);
    U0.Q-.0.7 = (U5.A-.7);
    U0.Q-.0.6 = (U5.A-.6);
    U0.Q-.0.5 = (U5.A-.5);
    U0.Q-.0.4 = (U5.A-.4);
    U0.Q-.0.3 = (U5.A-.3);
    U0.Q-.0.2 = (U5.A-.2);
    U0.Q-.0.1 = (U5.A-.1);
    U0.Q-.0.0 = (U5.A-.0);
    U0.Q-.1.7 = (U4.X-.7);
    U0.Q-.1.6 = (U4.X-.6);
    U0.Q-.1.5 = (U4.X-.5);
    U0.Q-.1.4 = (U4.X-.4);
    U0.Q-.1.3 = (U4.X-.3);
    U0.Q-.1.2 = (U4.X-.2);
    U0.Q-.1.1 = (U4.X-.1);
    U0.Q-.1.0 = (U4.X-.0);
    U0.Q-.2.7 = (U4.Y-.7);
    U0.Q-.2.6 = (U4.Y-.6);
    U0.Q-.2.5 = (U4.Y-.5);
    U0.Q-.2.4 = (U4.Y-.4);
    U0.Q-.2.3 = (U4.Y-.3);
    U0.Q-.2.2 = (U4.Y-.2);
    U0.Q-.2.1 = (U4.Y-.1);
    U0.Q-.2.0 = (U4.Y-.0);

  /* type converters *********************/

ANNOTATIONS
{
  BUS BUS_TYPE = "DOT";
}

END MODULE;


/* * * * * * *  Contents of NET file OSSV1CR.NET  * * * * * * */

/******************************************************/
/*  Netlist copyright (C) 1989 LSI Logic Corporation  */
/******************************************************/


MODULE OSSV1CR;

INPUTS      EN,NS0,NS1,STBIT0I,STBIT1I,WAIT;
OUTPUTS     LS_1,SPR0,SPR1,STBIT0O,STBIT1O;

LEVEL FUNCTION;
DEFINE
  /* implicit connectors ********************/
```

```
NS0- = (NS0);
STBIT0O- = (STBIT0O);
STBIT1I- = (STBIT1I);
SPR1- = (SPR1);
EN- = (EN);
STBIT0I- = (STBIT0I);
WAIT- = (WAIT);
STBIT1O- = (STBIT1O);
LS_1- = (LS_1);
NS1- = (NS1);
SPR0- = (SPR0);


/* part instances ***************************/

M3(M3.Z-=Z) = N1C(STBIT1I-=A);
M19(M19.Z-=Z) = N1B(NS0-=A);
M29(M29.Z-=Z) = ND4B(M3.Z-=D,M28.Z-=B,M19.Z-=A,M7.Z-=C);
M34(M34.Z-=Z) = ND4B(M31.Z-=D,STBIT0I-=C,NS0-=A,NS1-=B);
M2(M2.Z-=Z) = ND3B(M3.Z-=C,STBIT0I-=B,NS1-=A);
M42(SPR1-=Z) = ND4B(M16.Z-=C,M34.Z-=D,M2.Z-=A,M14.Z-=B);
M16(M16.Z-=Z) = ND2B(M15.Z-=A,STBIT0I-=B);
M9(M9.Z-=Z) = ND3B(M3.Z-=C,M8.Z-=B,M1.Z-=A);
M8(M8.Z-=Z) = AND2B(M7.Z-=B,M6.Z-=A);
M26(M26.Z-=Z) = ND3B(M31.Z-=C,M8.Z-=B,M1.Z-=A);
M1(M1.Z-=Z) = AND2B(NS1-=A,EN-=B);
M15(M15.Z-=Z) = N1B(EN-=A);
M17(M17.Z-=Z) = ND2B(M31.Z-=B,M15.Z-=A);
M27(M27.Z-=Z) = ND2B(M31.Z-=B,WAIT-=A);
M31(M31.Z-=Z) = N1C(M3.Z-=A);
M22(M22.Z-=Z) = AND2B(M7.Z-=A,M31.Z-=B);
M7(M7.Z-=Z) = N1C(STBIT0I-=A);
M10(M10.Z-=Z) = AND2B(NS1-=B,NS0-=A);
M13(M13.Z-=Z) = ND3B(M11.Z-=B,M12.Z-=C,M10.Z-=A);
M12(M12.Z-=Z) = AND2B(STBIT0I-=A,M3.Z-=B);
M32(M32.Z-=Z) = AND2B(M7.Z-=A,M3.Z-=B);
M33(M33.Z-=Z) = ND3B(M11.Z-=B,M32.Z-=C,M30.Z-=A);
M11(M11.Z-=Z) = AND2B(EN-=A,M6.Z-=B);
M6(M6.Z-=Z) = N1B(WAIT-=A);
M14(M14.Z-=Z) = ND2B(STBIT0I-=B,WAIT-=A);
M38(STBIT0O-=Z) = ND4B(M16.Z-=C,M13.Z-=A,M14.Z-=B,M26.Z-=D);
M40(M40.Z-=Z) = AND2B(M26.Z-=A,M27.Z-=B);
M36(M36.Z-=Z) = AND2B(M17.Z-=A,M27.Z-=B);
M37(STBIT1O-=Z) = ND3B(M33.Z-=C,M36.Z-=B,M35.Z-=A);
M35(M35.Z-=Z) = AND2B(M9.Z-=A,M13.Z-=B);
M43(LS_1-=Z) = ND4B(M33.Z-=D,M29.Z-=C,M23.Z-=B,M13.Z-=A);
M23(M23.Z-=Z) = ND3B(M11.Z-=B,M22.Z-=C,M20.Z-=A);
M20(M20.Z-=Z) = AND2B(NS1-=B,M19.Z-=A);
M28(M28.Z-=Z) = N1B(NS1-=A);
M30(M30.Z-=Z) = AND2B(NS0-=A,M28.Z-=B);
M18(M18.Z-=Z) = ND3B(M31.Z-=C,M7.Z-=B,NS0-=A);
M39(M39.Z-=Z) = AND2B(M17.Z-=A,M18.Z-=B);
M41(SPR0-=Z) = ND3B(M40.Z-=B,M34.Z-=C,M39.Z-=A);


/* extractors ******************************/


/* type converters **********************/
ANNOTATIONS
{
  BUS BUS_TYPE = "DOT";
}

END MODULE;


/* * * * * * *  Contents of NET file OSSV1FN.NET  * * * * * * * */

/*******************************************************/
/*  Netlist copyright (C) 1989 LSI Logic Corporation  */
/*******************************************************/
```

```
MODULE OSSV1FN;

INPUTS      CP,EN,NS.1,NS.0,RESET_,WAIT;
OUTPUTS     LS_1,SPR.1,SPR.0;

LEVEL FUNCTION;
DEFINE
  /* implicit connectors *******************/

    CP- = (CP);
    CP- = (CP);
    RESET_- = (RESET_);
    RESET_- = (RESET_);
    EN- = (EN);
    NS-.1 = (NS.1);
    NS-.0 = (NS.0);
    WAIT- = (WAIT);
    SPR-.1 = (SPR.1);
    SPR-.0 = (SPR.0);
    LS_1- = (LS_1);


  /* part instances **************************/

    U4.1(U4.Q-.1=Q) = FD2A(U4.D-.1=D,CP-=CP,RESET_-=CD);
    U4.0(U4.Q-.0=Q) = FD2A(U4.D-.0=D,CP-=CP,RESET_-=CD);
    U0(U0.STBIT1O-=STBIT1O,U0.STBIT0O-=STBIT0O,U0.LS_1-=LS_1,
            U0.SPR0-=SPR0,U0.SPR1-=SPR1) = OSSV1CR(U0.STBIT1I-=STBIT1I,
            U0.STBIT0I-=STBIT0I,EN-=EN,U0.NS0-=NS0,U0.NS1-=NS1,
            WAIT-=WAIT);
    U2.2(U2.Q-.2=Q) = FD2A(CP-=CP,RESET_-=CD,U2.D-.2=D);
    U2.1(U2.Q-.1=Q) = FD2A(CP-=CP,RESET_-=CD,U2.D-.1=D);
    U2.0(U2.Q-.0=Q) = FD2A(CP-=CP,RESET_-=CD,U2.D-.0=D);


  /* extractors *****************************/

    U2.D-.0 = (U0.LS_1-);
    U2.D-.1 = (U0.SPR0-);
    U4.D-.0 = (U0.STBIT0O-);
    U4.D-.1 = (U0.STBIT1O-);
    U4.Q-.1 = (U0.STBIT1I-);
    U4.Q-.0 = (U0.STBIT0I-);
    NS-.0 = (U0.NS0-);
    NS-.1 = (U0.NS1-);
    U2.D-.2 = (U0.SPR1-);
    U2.Q-.2 = (SPR-.1);
    U2.Q-.1 = (SPR-.0);
    U2.Q-.0 = (LS_1-);


  /* type converters ********************/

ANNOTATIONS
{
  BUS BUS_TYPE = "DOT";
}

END MODULE;



/* * * * * * *  Contents of NET file CNTR8D_DEC8_DEC4.NET  * * * * * * */

/******************************************************/
/*  Netlist copyright (C) 1989 LSI Logic Corporation  */
/******************************************************/


MODULE CNTR8D_DEC8_DEC4;

INPUTS      A.3,A.2,A.1,A.0,CIN;
OUTPUTS     CON,Y.3,Y.2,Y.1,Y.0;
```

```
LEVEL FUNCTION;
DEFINE
  /* implicit connectors ******************/

    CON- = (CON);
    CIN- = (CIN);
    A-.3 = (A.3);
    A-.2 = (A.2);
    A-.1 = (A.1);
    A-.0 = (A.0);
    Y-.3 = (Y.3);
    Y-.2 = (Y.2);
    Y-.1 = (Y.1);
    Y-.0 = (Y.0);


  /* part instances *************************/

    M___13(M___13.Z-=Z) = ENB(M___8.Z-=A,M___13.B-=B);
    M___7(M___7.Z-=Z) = ND3A(M___1.Z-=A,M___3.Z-=C,M___2.Z-=B);
    M___11(M___11.Z-=Z) = ENB(M___6.Z-=A,M___11.B-=B);
    M___6(M___6.Z-=Z) = ND2A(M___1.Z-=A,M___2.Z-=B);
    M___2(M___2.Z-=Z) = N1B(M___2.A-=A);
    M___4(M___4.Z-=Z) = N1B(M___4.A-=A);
    M___8(M___8.Z-=Z) = ND4A(M___1.Z-=A,M___3.Z-=C,M___2.Z-=B,
            M___4.Z-=D);
    M___3(M___3.Z-=Z) = N1B(M___3.A-=A);
    M___9(CON-=Z) = ND4B(M___5.Z-=D,M___4.Z-=C,M___2.Z-=A,M___3.Z-=B);
    M___5(M___5.Z-=Z) = NR2A(CIN-=A,M___5.B-=B);
    M___1(M___1.Z-=Z) = N1C(CIN-=A);
    M___10(M___10.Z-=Z) = EOB(M___1.Z-=A,M___10.B-=B);
    M___12(M___12.Z-=Z) = ENB(M___7.Z-=A,M___12.B-=B);


  /* extractors ****************************/

    Y-.0 = (M___10.Z-);
    Y-.3 = (M___13.Z-);
    A-.3 = (M___13.B-);
    Y-.1 = (M___11.Z-);
    A-.1 = (M___11.B-);
    A-.0 = (M___2.A-);
    A-.2 = (M___4.A-);
    A-.1 = (M___3.A-);
    A-.3 = (M___5.B-);
    A-.0 = (M___10.B-);
    A-.2 = (M___12.B-);
    Y-.2 = (M___12.Z-);


  /* type converters ********************/

ANNOTATIONS
{
  BUS BUS_TYPE = "DOT";
}

END MODULE;


/* * * * * * *  Contents of NET file SYNC.NET  * * * * * * */

/*******************************************************/
/*  Netlist copyright (C) 1989 LSI Logic Corporation  */
/*******************************************************/


MODULE SYNC;

INPUTS      CP,D,RESET_,SCLR_;
OUTPUTS     Z;

LEVEL FUNCTION;
DEFINE
  /* implicit connectors ******************/
```

```
    CP- = (CP);
    RESET_- = (RESET_);
    D- = (D);
    SCLR_- = (SCLR_);
    U1.TI- = (NC/0);
    Z- = (Z);


  /* part instances **************************/

    U2(U2.Z-=Z) = N1B(SCLR_-=A);
    U1(U1.Q-=Q) = FD2SA(CP-=CP,RESET_-=CD,D-=D,U2.Z-=TE,U1.TI-=TI);
    U0(Z-=Q) = FD2SA(U1.Q-=D,CP-=CP,RESET_-=CD,U2.Z-=TE,U1.TI-=TI);


  /* extractors ******************************/


  /* type converters *********************/

ANNOTATIONS
{
  BUS BUS_TYPE = "DOT";
}

END MODULE;


/* * * * * * *  Contents of NET file CNTR8D_DEC8.NET  * * * * * * */

/*******************************************************/
/*  Netlist copyright (C) 1989 LSI Logic Corporation   */
/*******************************************************/


MODULE CNTR8D_DEC8;

INPUTS      A.7,A.6,A.5,A.4,A.3,A.2,A.1,A.0,CIN;
OUTPUTS     CON,Y.7,Y.6,Y.5,Y.4,Y.3,Y.2,Y.1,Y.0;

LEVEL FUNCTION;
DEFINE
  /* implicit connectors *******************/

    CIN- = (CIN);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    Y-.7 = (Y.7);
    Y-.6 = (Y.6);
    Y-.5 = (Y.5);
    Y-.4 = (Y.4);
    Y-.3 = (Y.3);
    Y-.2 = (Y.2);
    Y-.1 = (Y.1);
    Y-.0 = (Y.0);
    CON- = (CON);


  /* part instances **************************/

    M___1(M___1.CON-=CON,M___1.Y-.3=Y.3,M___1.Y-.2=Y.2,M___1.Y-.1=Y.1,
            M___1.Y-.0=Y.0) = CNTR8D_DEC8_DEC4(CIN-=CIN,M___1.A-.3=A.3,
            M___1.A-.2=A.2,M___1.A-.1=A.1,M___1.A-.0=A.0);
    M___2(CON-=CON,M___2.Y-.3=Y.3,M___2.Y-.2=Y.2,M___2.Y-.1=Y.1,
            M___2.Y-.0=Y.0) = CNTR8D_DEC8_DEC4(M___2.A-.3=A.3,
            M___2.A-.2=A.2,M___2.A-.1=A.1,M___2.A-.0=A.0,
            M___1.CON-=CIN);
```

```
  /* extractors ******************************/

    A-.7 = (M___2.A-.3);
    A-.6 = (M___2.A-.2);
    A-.5 = (M___2.A-.1);
    A-.4 = (M___2.A-.0);
    A-.3 = (M___1.A-.3);
    A-.2 = (M___1.A-.2);
    A-.1 = (M___1.A-.1);
    A-.0 = (M___1.A-.0);
    Y-.3 = (M___1.Y-.3);
    Y-.2 = (M___1.Y-.2);
    Y-.1 = (M___1.Y-.1);
    Y-.0 = (M___1.Y-.0);
    Y-.7 = (M___2.Y-.3);
    Y-.6 = (M___2.Y-.2);
    Y-.5 = (M___2.Y-.1);
    Y-.4 = (M___2.Y-.0);


  /* type converters *********************/

ANNOTATIONS
{
  BUS BUS_TYPE = "DOT";
}

END MODULE;



/* * * * * * *  Contents of NET file CNTR8D.NET  * * * * * * */

/*******************************************************/
/*  Netlist copyright (C) 1989 LSI Logic Corporation  */
/*******************************************************/


MODULE CNTR8D;

INPUTS      CE,CP,D.7,D.6,D.5,D.4,D.3,D.2,D.1,D.0,LD,RESET_;
OUTPUTS     CO,Q.7,Q.6,Q.5,Q.4,Q.3,Q.2,Q.1,Q.0;

LEVEL FUNCTION;
DEFINE
  /* implicit connectors *******************/

    CE- = (CE);
    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    RESET_- = (RESET_);
    CP- = (CP);
    LD- = (LD);
    CO- = (CO);


  /* part instances ***************************/

    M___10(M___10.Z-=Z) = N1C(CE-=A);
    U0(U0.Z-=Z) = B3A(RESET_-=A);
    M___3(M___3.Q-=Q) = FD2SA(U0.Z-=CD,CP-=CP,M___3.D-=D,LD-=TE,
```

```
            M___3.TI-=TI);
    M___6(M___6.Q-=Q) = FD2SA(U0.Z-=CD,CP-=CP,M___6.D-=D,LD-=TE,
            M___6.TI-=TI);
    M___8(M___8.Q-=Q) = FD2SA(U0.Z-=CD,CP-=CP,M___8.D-=D,LD-=TE,
            M___8.TI-=TI);
    M___5(M___5.Q-=Q) = FD2SA(U0.Z-=CD,CP-=CP,M___5.D-=D,LD-=TE,
            M___5.TI-=TI);
    M___4(M___4.Q-=Q) = FD2SA(U0.Z-=CD,CP-=CP,M___4.D-=D,LD-=TE,
            M___4.TI-=TI);
    M___2(M___2.Q-=Q) = FD2SA(U0.Z-=CD,CP-=CP,M___2.D-=D,LD-=TE,
            M___2.TI-=TI);
    M___7(M___7.Q-=Q) = FD2SA(U0.Z-=CD,CP-=CP,M___7.D-=D,LD-=TE,
            M___7.TI-=TI);
    M___1(M___1.Q-=Q) = FD2SA(U0.Z-=CD,CP-=CP,M___1.D-=D,LD-=TE,
            M___1.TI-=TI);
    M___9(M___9.CON-=CON,M___9.Y-.7=Y.7,M___9.Y-.6=Y.6,M___9.Y-.5=Y.5,
            M___9.Y-.4=Y.4,M___9.Y-.3=Y.3,M___9.Y-.2=Y.2,
            M___9.Y-.1=Y.1,M___9.Y-.0=Y.0) = CNTR8D_DEC8(M___10.Z-=CIN,
            Q-.7=A.7,Q-.6=A.6,Q-.5=A.5,Q-.4=A.4,Q-.3=A.3,Q-.2=A.2,
            Q-.1=A.1,Q-.0=A.0);
    U1(CO-=Z) = N1B(M___9.CON-=A);


  /* extractors ******************************/

    Q-.6 = (M___7.Q-);
    M___9.Y-.0 = (M___1.D-);
    M___9.Y-.6 = (M___7.D-);
    M___9.Y-.2 = (M___3.D-);
    Q-.2 = (M___3.Q-);
    D-.2 = (M___3.TI-);
    M___9.Y-.5 = (M___6.D-);
    Q-.5 = (M___6.Q-);
    D-.5 = (M___6.TI-);
    Q-.7 = (M___8.Q-);
    M___9.Y-.7 = (M___8.D-);
    D-.7 = (M___8.TI-);
    M___9.Y-.4 = (M___5.D-);
    Q-.4 = (M___5.Q-);
    D-.4 = (M___5.TI-);
    Q-.3 = (M___4.Q-);
    D-.3 = (M___4.TI-);
    M___9.Y-.3 = (M___4.D-);
    M___9.Y-.1 = (M___2.D-);
    Q-.1 = (M___2.Q-);
    D-.1 = (M___2.TI-);
    D-.6 = (M___7.TI-);
    D-.0 = (M___1.TI-);
    Q-.0 = (M___1.Q-);


  /* type converters **********************/

ANNOTATIONS
{
  BUS BUS_TYPE = "DOT";
}

END MODULE;



/* * * * * * *  Contents of NET file MRGCNTV1CR.NET  * * * * * * */

/*******************************************************/
/*  Netlist copyright (C) 1989 LSI Logic Corporation  */
/*******************************************************/


MODULE MRGCNTV1CR;

INPUTS       CO,CTEFF,CTONLY,FE,FNE,HDF,LS_1,LWONLY,OFF,REQ_O,
             STBIT0I,STBIT1I,STBIT2I,STBIT3I,STF,WAIT;
OUTPUTS      CE,FEAK,LDC,LDH,LDK,LDM,LDY,MWAIT,RD_,STBIT0O,STBIT1O,
             STBIT2O,STBIT3O,WE;
```

```
LEVEL FUNCTION;
DEFINE
  /* implicit connectors *******************/

    CTONLY- = (CTONLY);
    OFF- = (OFF);
    LS_1- = (LS_1);
    CTEFF- = (CTEFF);
    WAIT- = (WAIT);
    WE- = (WE);
    STBIT2I- = (STBIT2I);
    REQ_O- = (REQ_O);
    LWONLY- = (LWONLY);
    STBIT1I- = (STBIT1I);
    LDY- = (LDY);
    LDH- = (LDH);
    STBIT0I- = (STBIT0I);
    CO- = (CO);
    STBIT3I- = (STBIT3I);
    HDF- = (HDF);
    STBIT0O- = (STBIT0O);
    STBIT2O- = (STBIT2O);
    STBIT3O- = (STBIT3O);
    FNE- = (FNE);
    LDK- = (LDK);
    LDM- = (LDM);
    MWAIT- = (MWAIT);
    FEAK- = (FEAK);
    LDC- = (LDC);
    STF- = (STF);
    FE- = (FE);
    RD_- = (RD_);
    STBIT1O- = (STBIT1O);
    CE- = (CE);


  /* part instances **************************/

    M303(M303.Z-=Z) = N1B(CTONLY-=A);
    M295(M295.Z-=Z) = N1C(M303.Z-=A);
    M64(M64.Z-=Z) = N1C(LS_1-=A);
    M252(M252.Z-=Z) = N1C(M64.Z-=A);
    M262(M262.Z-=Z) = N1B(CTEFF-=A);
    M260(M260.Z-=Z) = N1C(M262.Z-=A);
    M52(M52.Z-=Z) = N1D(WAIT-=A);
    M310(M310.Z-=Z) = N1C(M52.Z-=A);
    M1(M1.Z-=Z) = N1D(STBIT2I-=A);
    M248(M248.Z-=Z) = AND2B(M253.Z-=A,M311.Z-=B);
    M217(M217.Z-=Z) = AND3B(M311.Z-=C,M310.Z-=B,M263.Z-=A);
    M133(M133.Z-=Z) = N1C(REQ_O-=A);
    M40(M40.Z-=Z) = N1C(LWONLY-=A);
    M80(M80.Z-=Z) = ND2B(M40.Z-=A,M295.Z-=B);
    M82(M82.Z-=Z) = NR2B(M80.Z-=A,M81.Z-=B);
    M81(M81.Z-=Z) = ND2B(M52.Z-=A,M311.Z-=B);
    M90(M90.Z-=Z) = NR2B(M81.Z-=B,M88.Z-=A);
    M88(M88.Z-=Z) = ND2B(M40.Z-=B,M260.Z-=A);
    M263(M263.Z-=Z) = N1C(M40.Z-=A);
    M138(M138.Z-=Z) = AND3B(M133.Z-=A,M260.Z-=C,M253.Z-=B);
    M142(M142.Z-=Z) = AND2B(M263.Z-=B,M253.Z-=A);
    M324(M324.Z-=Z) = N1D(M1.Z-=A);
    M3(M3.Z-=Z) = N1D(STBIT1I-=A);
    M66(M66.Z-=Z) = AND3B(M311.Z-=B,M260.Z-=A,M3.Z-=C);
    M75(M75.Z-=Z) = AND3C(M335.Z-=C,M1.Z-=B,M3.Z-=A);
    M67(M67.Z-=Z) = AND2C(M335.Z-=B,M1.Z-=A);
    M257(M257.Z-=Z) = ND4B(M335.Z-=D,M52.Z-=B,M3.Z-=C,M263.Z-=A);
    M321(LDY-=Z) = ND2B(M39.Z-=B,M31.Z-=A);
    M318(LDH-=Z) = ND2B(M27.Z-=A,M35.Z-=B);
    M130(M130.Z-=Z) = ND4B(M335.Z-=D,M12.Z-=A,M324.Z-=C,M3.Z-=B);
    M129(M129.Z-=Z) = ND4B(M335.Z-=D,M1.Z-=C,M12.Z-=A,STBIT1I-=B);
    M131(M131.Z-=Z) = ND3B(M335.Z-=C,M1.Z-=B,M12.Z-=A);
    M311(M311.Z-=Z) = N1D(M12.Z-=A);
    M12(M12.Z-=Z) = N1D(STBIT0I-=A);
    M116(M116.Z-=Z) = ND2B(M335.Z-=B,M3.Z-=A);
    M115(M115.Z-=Z) = ND3B(M311.Z-=A,M324.Z-=C,M3.Z-=B);
    M154(M154.Z-=Z) = ND4B(M335.Z-=D,M12.Z-=A,M324.Z-=C,STBIT1I-=B);
```

```
M162(M162.Z-=Z) = AND3B(M40.Z-=C,M260.Z-=B,M253.Z-=A);
M41(M41.Z-=Z) = AND3B(M40.Z-=C,M253.Z-=B,M246.Z-=A);
M44(M44.Z-=Z) = ND3B(M340.Z-=C,M41.Z-=A,M42.Z-=B);
M188(M188.Z-=Z) = ND3B(M340.Z-=C,M42.Z-=B,M185.Z-=A);
M190(M190.Z-=Z) = AND3B(M311.Z-=C,M310.Z-=B,M260.Z-=A);
M192(M192.Z-=Z) = ND3B(M340.Z-=C,M185.Z-=A,M190.Z-=B);
M199(M199.Z-=Z) = AND3B(M251.Z-=B,M253.Z-=C,OFF-=A);
M78(M78.Z-=Z) = ND2B(M252.Z-=A,M253.Z-=B);
M79(M79.Z-=Z) = NR2C(M77.Z-=A,M78.Z-=B);
M76(M76.Z-=Z) = ND3B(M75.Z-=C,M73.Z-=A,M74.Z-=B);
M51(M51.Z-=Z) = AND3B(M49.Z-=A,M50.Z-=B,M251.Z-=C);
M101(M101.Z-=Z) = AND3B(M52.Z-=C,M253.Z-=A,M263.Z-=B);
M105(M105.Z-=Z) = ND3B(M360.Z-=C,M100.Z-=A,M101.Z-=B);
M100(M100.Z-=Z) = AND3B(M49.Z-=A,M50.Z-=B,M252.Z-=C);
M50(M50.Z-=Z) = N1C(CO-=A);
M246(M246.Z-=Z) = N1C(M50.Z-=A);
M176(M176.Z-=Z) = AND3B(M311.Z-=C,M253.Z-=A,M263.Z-=B);
M178(M178.Z-=Z) = ND3B(M75.Z-=C,M175.Z-=A,M176.Z-=B);
M175(M175.Z-=Z) = AND3B(M50.Z-=B,M252.Z-=C,OFF-=A);
M73(M73.Z-=Z) = AND3B(M49.Z-=A,M50.Z-=B,M253.Z-=C);
M49(M49.Z-=Z) = N1C(OFF-=A);
M118(M118.Z-=Z) = AND3B(M52.Z-=A,M311.Z-=B,M3.Z-=C);
M210(M210.Z-=Z) = ND3B(M118.Z-=B,M207.Z-=A,M30.Z-=C);
M120(M120.Z-=Z) = ND3C(M117.Z-=A,M118.Z-=B,M30.Z-=C);
M117(M117.Z-=Z) = AND3B(M49.Z-=A,M253.Z-=B,M263.Z-=C);
M77(M77.Z-=Z) = ND2B(M49.Z-=A,M251.Z-=B);
M167(M167.Z-=Z) = AND2B(OFF-=A,M251.Z-=B);
M251(M251.Z-=Z) = N1C(M133.Z-=A);
M121(M121.Z-=Z) = AND3B(M49.Z-=A,M251.Z-=B,M253.Z-=C);
M126(M126.Z-=Z) = AND3B(M52.Z-=B,M311.Z-=C,M295.Z-=A);
M128(M128.Z-=Z) = ND3B(M108.Z-=C,M121.Z-=A,M126.Z-=B);
M108(M108.Z-=Z) = AND3C(M8.Z-=C,M324.Z-=B,M3.Z-=A);
M9(M9.Z-=Z) = AND2C(M8.Z-=B,M1.Z-=A);
M30(M30.Z-=Z) = AND2C(M8.Z-=B,M324.Z-=A);
M264(M264.Z-=Z) = ND3B(M212.Z-=A,M8.Z-=C,M249.Z-=B);
M8(M8.Z-=Z) = N1D(STBIT3I-=A);
M335(M335.Z-=Z) = N1D(M8.Z-=A);
M214(M214.Z-=Z) = AND3B(M8.Z-=C,M12.Z-=A,M324.Z-=B);
M256(M256.Z-=Z) = ND4B(M255.Z-=A,M12.Z-=B,M324.Z-=D,M3.Z-=C);
M255(M255.Z-=Z) = N1B(HDF-=A);
M107(M107.Z-=Z) = AND2C(M12.Z-=B,M253.Z-=A);
M275(M275.Z-=Z) = AND2B(M31.Z-=A,M39.Z-=B);
M146(M146.Z-=Z) = AND2B(M253.Z-=A,M295.Z-=B);
M149(M149.Z-=Z) = ND3B(M143.Z-=B,M144.Z-=C,M146.Z-=A);
M143(M143.Z-=Z) = AND2B(M310.Z-=A,M311.Z-=B);
M150(M150.Z-=Z) = AND2B(M253.Z-=A,M260.Z-=B);
M153(M153.Z-=Z) = ND3B(M143.Z-=B,M144.Z-=C,M150.Z-=A);
M284(M284.Z-=Z) = NR2B(M283.Z-=B,M282.Z-=A);
M156(M156.Z-=Z) = AND3B(M40.Z-=B,M295.Z-=C,M253.Z-=A);
M160(M160.Z-=Z) = ND3B(M360.Z-=C,M155.Z-=A,M156.Z-=B);
M282(M282.Z-=Z) = ND3B(M280.Z-=A,M281.Z-=B,M160.Z-=C);
M281(M281.Z-=Z) = AND2B(M153.Z-=B,M149.Z-=A);
M304(M304.Z-=Z) = ND3B(M280.Z-=B,M302.Z-=A,M149.Z-=C);
M308(M308.Z-=Z) = NR2B(M304.Z-=A,M307.Z-=B);
M317(STBIT0O-=Z) = ND3B(M316.Z-=C,M308.Z-=B,M301.Z-=A);
M301(M301.Z-=Z) = NR2B(M297.Z-=A,M300.Z-=B);
M297(M297.Z-=Z) = ND3B(M276.Z-=A,M296.Z-=B,M84.Z-=C);
M277(M277.Z-=Z) = ND3B(M98.Z-=C,M275.Z-=A,M276.Z-=B);
M279(M279.Z-=Z) = NR2B(M277.Z-=A,M278.Z-=B);
M290(STBIT2O-=Z) = ND3B(M289.Z-=C,M284.Z-=B,M279.Z-=A);
M289(M289.Z-=Z) = NR2B(M288.Z-=B,M287.Z-=A);
M288(M288.Z-=Z) = ND4B(M215.Z-=A,M219.Z-=B,M227.Z-=C,M239.Z-=D);
M331(M331.Z-=Z) = NR2B(M330.Z-=B,M329.Z-=A);
M329(M329.Z-=Z) = ND2B(M243.Z-=B,M239.Z-=A);
M239(M239.Z-=Z) = ND3B(M107.Z-=B,M212.Z-=A,M238.Z-=C);
M13(M13.Z-=Z) = AND2C(M12.Z-=A,STBIT1I-=B);
M4(M4.Z-=Z) = AND2C(M5.Z-=A,M253.Z-=B);
M291(M291.Z-=Z) = AND3B(M19.Z-=B,M31.Z-=C,M15.Z-=A);
M266(M266.Z-=Z) = ND4B(M39.Z-=D,M31.Z-=B,M27.Z-=A,M35.Z-=C);
M137(M137.Z-=Z) = ND3B(M70.Z-=B,M134.Z-=A,M30.Z-=C);
M72(M72.Z-=Z) = ND3B(M65.Z-=A,M70.Z-=B,M67.Z-=C);
M221(M221.Z-=Z) = AND3B(M311.Z-=B,M3.Z-=C,M263.Z-=A);
M223(M223.Z-=Z) = ND3B(M65.Z-=A,M221.Z-=B,M67.Z-=C);
M272(M272.Z-=Z) = ND3B(M219.Z-=B,M128.Z-=A,M223.Z-=C);
M273(M273.Z-=Z) = NR2B(M272.Z-=B,M271.Z-=A);
M270(M270.Z-=Z) = NR2B(M268.Z-=A,M269.Z-=B);
```

```
M274(STBIT3O-=Z) = ND3B(M273.Z-=C,M270.Z-=B,M267.Z-=A);
M267(M267.Z-=Z) = NR2B(M265.Z-=A,M266.Z-=B);
M211(M211.Z-=Z) = N1B(FNE-=A);
M11(M11.Z-=Z) = AND2C(M253.Z-=B,FNE-=A);
M23(M23.Z-=Z) = ND3B(M9.Z-=C,M11.Z-=A,M2.Z-=B);
M322(LDK-=Z) = ND2B(M10.Z-=A,M23.Z-=B);
M265(M265.Z-=Z) = ND4B(M10.Z-=A,M23.Z-=D,M19.Z-=C,M15.Z-=B);
M320(LDM-=Z) = ND2B(M19.Z-=B,M15.Z-=A);
M366(M366.Z-=Z) = NR2B(M362.Z-=A,M365.Z-=B);
M358(M358.Z-=Z) = NR2B(M354.Z-=A,M357.Z-=B);
M367(MWAIT-=Z) = ND3B(M366.Z-=C,M358.Z-=B,M350.Z-=A);
M350(M350.Z-=Z) = NR2B(M346.Z-=A,M349.Z-=B);
M344(M344.Z-=Z) = AND2B(M27.Z-=A,M31.Z-=B);
M346(M346.Z-=Z) = ND3B(M343.Z-=A,M344.Z-=B,M345.Z-=C);
M343(M343.Z-=Z) = AND2B(M15.Z-=A,M19.Z-=B);
M19(M19.Z-=Z) = ND3C(M4.Z-=A,M9.Z-=C,M13.Z-=B);
M15(M15.Z-=Z) = ND3C(M9.Z-=C,M11.Z-=A,M13.Z-=B);
M337(M337.Z-=Z) = AND3B(M10.Z-=A,M19.Z-=C,M15.Z-=B);
M342(FEAK-=Z) = ND3B(M341.Z-=C,M338.Z-=B,M337.Z-=A);
M339(M339.Z-=Z) = ND2B(M39.Z-=B,M35.Z-=A);
M341(M341.Z-=Z) = NR2B(M339.Z-=A,LDC-=B);
M319(LDC-=Z) = ND2B(M114.Z-=B,M109.Z-=A);
M99(M99.Z-=Z) = ND4B(M335.Z-=D,M52.Z-=A,M324.Z-=C,M3.Z-=B);
M347(M347.Z-=Z) = AND2B(M94.Z-=A,M99.Z-=B);
M349(M349.Z-=Z) = ND3B(M114.Z-=C,M347.Z-=A,M348.Z-=B);
M253(M253.Z-=Z) = N1D(M93.Z-=A);
M93(M93.Z-=Z) = N1C(STF-=A);
M110(M110.Z-=Z) = ND3B(M93.Z-=A,M335.Z-=C,M3.Z-=B);
M348(M348.Z-=Z) = AND2B(M109.Z-=A,M110.Z-=B);
M109(M109.Z-=Z) = ND3C(M108.Z-=C,M107.Z-=B,M106.Z-=A);
M106(M106.Z-=Z) = AND2B(HDF-=B,FNE-=A);
M213(M213.Z-=Z) = AND2B(HDF-=A,M253.Z-=B);
M215(M215.Z-=Z) = ND3B(M212.Z-=A,M214.Z-=C,M213.Z-=B);
M212(M212.Z-=Z) = AND2C(M211.Z-=B,FE-=A);
M5(M5.Z-=Z) = N1B(FE-=A);
M111(M111.Z-=Z) = AND2B(HDF-=B,M5.Z-=A);
M114(M114.Z-=Z) = ND3C(M108.Z-=C,M107.Z-=B,M111.Z-=A);
M206(M206.Z-=Z) = ND3B(M108.Z-=C,M122.Z-=B,M199.Z-=A);
M202(M202.Z-=Z) = ND3B(M108.Z-=C,M126.Z-=B,M199.Z-=A);
M286(M286.Z-=Z) = AND2B(M206.Z-=B,M202.Z-=A);
M287(M287.Z-=Z) = ND3B(M285.Z-=A,M286.Z-=B,M210.Z-=C);
M285(M285.Z-=Z) = AND2B(M192.Z-=A,M198.Z-=B);
M198(M198.Z-=Z) = ND3B(M360.Z-=C,M162.Z-=B,M179.Z-=A);
M166(M166.Z-=Z) = ND3B(M360.Z-=C,M155.Z-=A,M162.Z-=B);
M306(M306.Z-=Z) = AND2B(M160.Z-=A,M166.Z-=B);
M307(M307.Z-=Z) = ND3B(M178.Z-=C,M305.Z-=A,M306.Z-=B);
M305(M305.Z-=Z) = AND2B(M154.Z-=B,M153.Z-=A);
M328(M328.Z-=Z) = AND3B(M215.Z-=C,M131.Z-=A,M154.Z-=B);
M332(RD_-=Z) = ND3B(M331.Z-=C,M327.Z-=A,M328.Z-=B);
M327(M327.Z-=Z) = AND3B(M116.Z-=C,M115.Z-=B,M94.Z-=A);
M94(M94.Z-=Z) = ND2B(M93.Z-=A,M12.Z-=B);
M25(M25.Z-=Z) = AND2B(M3.Z-=B,M12.Z-=A);
M27(M27.Z-=Z) = ND3C(M9.Z-=C,M11.Z-=A,M25.Z-=B);
M338(M338.Z-=Z) = AND3B(M23.Z-=A,M31.Z-=C,M27.Z-=B);
M31(M31.Z-=Z) = ND3C(M4.Z-=A,M13.Z-=B,M30.Z-=C);
M39(M39.Z-=Z) = ND3C(M11.Z-=A,M13.Z-=B,M30.Z-=C);
M345(M345.Z-=Z) = AND2B(M35.Z-=A,M39.Z-=B);
M35(M35.Z-=Z) = ND3C(M4.Z-=A,M9.Z-=C,M25.Z-=B);
M10(M10.Z-=Z) = ND3B(M4.Z-=A,M9.Z-=C,M2.Z-=B);
M2(M2.Z-=Z) = AND2B(M3.Z-=B,M311.Z-=A);
M95(M95.Z-=Z) = AND2B(M253.Z-=A,M310.Z-=B);
M98(M98.Z-=Z) = ND3B(M2.Z-=B,M95.Z-=A,M97.Z-=C);
M97(M97.Z-=Z) = AND2B(M324.Z-=A,M335.Z-=B);
M43(M43.Z-=Z) = ND2C(M335.Z-=B,M3.Z-=A);
M340(M340.Z-=Z) = N1D(M43.Z-=A);
M48(M48.Z-=Z) = ND3B(M340.Z-=C,M45.Z-=A,M46.Z-=B);
M276(M276.Z-=Z) = AND2B(M44.Z-=A,M48.Z-=B);
M268(M268.Z-=Z) = ND4B(M48.Z-=B,M72.Z-=D,M44.Z-=A,M68.Z-=C);
M296(M296.Z-=Z) = AND2B(M68.Z-=A,M72.Z-=B);
M68(M68.Z-=Z) = ND3B(M65.Z-=A,M66.Z-=B,M67.Z-=C);
M258(M258.Z-=Z) = AND2B(M246.Z-=A,M252.Z-=B);
M259(M259.Z-=Z) = AND2B(M263.Z-=A,M3.Z-=B);
M261(M261.Z-=Z) = ND3B(M67.Z-=C,M258.Z-=A,M259.Z-=B);
M364(M364.Z-=Z) = AND2B(M257.Z-=A,M261.Z-=B);
```

```
M365(M365.Z-=Z) = ND3B(M264.Z-=C,M363.Z-=A,M364.Z-=B);
M330(M330.Z-=Z) = ND2B(M264.Z-=B,M256.Z-=A);
M363(M363.Z-=Z) = AND2B(M254.Z-=A,M256.Z-=B);
M254(M254.Z-=Z) = ND3B(M340.Z-=C,M172.Z-=B,M244.Z-=A);
M244(M244.Z-=Z) = AND2B(M246.Z-=A,M133.Z-=B);
M247(M247.Z-=Z) = ND3B(M340.Z-=C,M168.Z-=B,M244.Z-=A);
M168(M168.Z-=Z) = AND2B(M260.Z-=A,M52.Z-=B);
M170(M170.Z-=Z) = ND3B(M340.Z-=C,M167.Z-=A,M168.Z-=B);
M353(M353.Z-=Z) = AND2B(M154.Z-=A,M170.Z-=B);
M354(M354.Z-=Z) = ND3B(M351.Z-=A,M352.Z-=B,M353.Z-=C);
M351(M351.Z-=Z) = AND2B(M120.Z-=A,M130.Z-=B);
M292(M292.Z-=Z) = AND3B(M129.Z-=B,M39.Z-=A,M130.Z-=C);
M294(STBIT1O-=Z) = ND3B(M291.Z-=A,M292.Z-=B,M293.Z-=C);
M293(M293.Z-=Z) = AND2B(M239.Z-=A,M243.Z-=B);
M243(M243.Z-=Z) = ND3B(M107.Z-=B,M212.Z-=A,M242.Z-=C);
M242(M242.Z-=Z) = AND2B(STBIT1I-=A,M1.Z-=B);
M238(M238.Z-=Z) = AND3B(M8.Z-=C,M324.Z-=B,STBIT1I-=A);
M144(M144.Z-=Z) = AND2B(M3.Z-=A,M324.Z-=B);
M145(M145.Z-=Z) = ND3B(M142.Z-=A,M143.Z-=B,M144.Z-=C);
M280(M280.Z-=Z) = AND2B(M141.Z-=A,M145.Z-=B);
M141(M141.Z-=Z) = ND3B(M138.Z-=A,M139.Z-=B,M30.Z-=C);
M139(M139.Z-=Z) = AND3B(M40.Z-=A,M311.Z-=B,M3.Z-=C);
M134(M134.Z-=Z) = AND3B(M40.Z-=C,M133.Z-=A,M253.Z-=B);
M179(M179.Z-=Z) = AND3B(M50.Z-=A,M133.Z-=B,M252.Z-=C);
M184(M184.Z-=Z) = ND3B(M360.Z-=C,M156.Z-=B,M179.Z-=A);
M283(M283.Z-=Z) = ND4B(M178.Z-=B,M166.Z-=A,M188.Z-=D,M184.Z-=C);
M309(M309.Z-=Z) = AND2B(M184.Z-=A,M188.Z-=B);
M312(M312.Z-=Z) = ND3B(M285.Z-=B,M286.Z-=C,M309.Z-=A);
M316(M316.Z-=Z) = NR2B(M312.Z-=A,M315.Z-=B);
M315(M315.Z-=Z) = ND3B(M313.Z-=A,M314.Z-=B,M250.Z-=C);
M314(M314.Z-=Z) = AND2B(M223.Z-=A,M227.Z-=B);
M227(M227.Z-=Z) = ND3B(M340.Z-=C,M185.Z-=A,M217.Z-=B);
M219(M219.Z-=Z) = ND3B(M340.Z-=C,M216.Z-=A,M217.Z-=B);
M313(M313.Z-=Z) = AND2B(M210.Z-=A,M219.Z-=B);
M356(M356.Z-=Z) = AND2B(M206.Z-=A,M210.Z-=B);
M357(M357.Z-=Z) = ND3B(M215.Z-=C,M355.Z-=A,M356.Z-=B);
M355(M355.Z-=Z) = AND2B(M174.Z-=A,M202.Z-=B);
M174(M174.Z-=Z) = ND3B(M340.Z-=C,M167.Z-=A,M172.Z-=B);
M172(M172.Z-=Z) = AND2B(M295.Z-=A,M52.Z-=B);
M231(M231.Z-=Z) = ND3B(M340.Z-=C,M172.Z-=B,M228.Z-=A);
M228(M228.Z-=Z) = AND2B(M246.Z-=A,M64.Z-=B);
M235(M235.Z-=Z) = ND3B(M340.Z-=C,M168.Z-=B,M228.Z-=A);
M359(M359.Z-=Z) = AND2B(M231.Z-=A,M235.Z-=B);
M362(M362.Z-=Z) = ND3B(M361.Z-=C,M293.Z-=B,M359.Z-=A);
M361(M361.Z-=Z) = AND2B(M250.Z-=B,M247.Z-=A);
M250(M250.Z-=Z) = ND3B(M8.Z-=C,M248.Z-=A,M249.Z-=B);
M249(M249.Z-=Z) = AND2B(M3.Z-=A,M1.Z-=B);
M55(M55.Z-=Z) = ND2B(M335.Z-=B,M1.Z-=A);
M54(M54.Z-=Z) = ND2B(M311.Z-=A,M3.Z-=B);
M56(M56.Z-=Z) = OR2B(M55.Z-=B,M54.Z-=A);
M360(M360.Z-=Z) = N1C(M56.Z-=A);
M63(M63.Z-=Z) = ND3B(M360.Z-=C,M51.Z-=A,M59.Z-=B);
M53(M53.Z-=Z) = AND3B(M52.Z-=C,M295.Z-=B,M253.Z-=A);
M57(M57.Z-=Z) = ND3B(M360.Z-=C,M51.Z-=A,M53.Z-=B);
M333(M333.Z-=Z) = AND3B(M76.Z-=C,M63.Z-=B,M57.Z-=A);
M336(WE-=Z) = ND3B(M333.Z-=A,M334.Z-=B,M325.Z-=C);
M334(M334.Z-=Z) = AND3B(M92.Z-=B,M84.Z-=A,M120.Z-=C);
M323(M323.Z-=Z) = AND2B(M84.Z-=A,M92.Z-=B);
M92(M92.Z-=Z) = ND3C(M90.Z-=B,M79.Z-=A,M75.Z-=C);
M84(M84.Z-=Z) = ND3C(M82.Z-=B,M79.Z-=A,M75.Z-=C);
M269(M269.Z-=Z) = ND4B(M98.Z-=C,M92.Z-=B,M105.Z-=D,M84.Z-=A);
M298(M298.Z-=Z) = AND2B(M92.Z-=A,M98.Z-=B);
M300(M300.Z-=Z) = ND3B(M298.Z-=A,M299.Z-=B,M124.Z-=C);
M299(M299.Z-=Z) = AND2B(M120.Z-=B,M105.Z-=A);
M271(M271.Z-=Z) = ND4B(M114.Z-=B,M124.Z-=D,M109.Z-=A,M120.Z-=C);
M124(M124.Z-=Z) = ND3B(M108.Z-=C,M121.Z-=A,M122.Z-=B);
M122(M122.Z-=Z) = AND3B(M52.Z-=B,M311.Z-=C,M260.Z-=A);
M59(M59.Z-=Z) = AND3B(M52.Z-=C,M260.Z-=B,M253.Z-=A);
M45(M45.Z-=Z) = AND3B(M260.Z-=C,M253.Z-=B,M246.Z-=A);
M216(M216.Z-=Z) = AND3B(M64.Z-=B,M253.Z-=C,M246.Z-=A);
M65(M65.Z-=Z) = AND3B(M50.Z-=A,M64.Z-=B,M253.Z-=C);
M185(M185.Z-=Z) = AND3B(M50.Z-=A,M252.Z-=B,M253.Z-=C);
M155(M155.Z-=Z) = AND3B(M251.Z-=B,M252.Z-=C,OFF-=A);
M207(M207.Z-=Z) = AND3B(M253.Z-=B,M263.Z-=C,OFF-=A);
```

```
    M74(M74.Z-=Z) = AND3B(M52.Z-=B,M311.Z-=C,M263.Z-=A);
    M46(M46.Z-=Z) = AND3B(M40.Z-=A,M311.Z-=C,M310.Z-=B);
    M42(M42.Z-=Z) = AND3B(M311.Z-=C,M310.Z-=B,M295.Z-=A);
    M70(M70.Z-=Z) = AND3B(M311.Z-=B,M295.Z-=A,M3.Z-=C);
    M132(M132.Z-=Z) = ND3B(M93.Z-=A,M324.Z-=C,M3.Z-=B);
    M352(M352.Z-=Z) = AND2B(M131.Z-=A,M132.Z-=B);
    M278(M278.Z-=Z) = ND4B(M114.Z-=B,M137.Z-=D,M109.Z-=A,M131.Z-=C);
    M302(M302.Z-=Z) = AND2B(M128.Z-=A,M137.Z-=B);
    M325(M325.Z-=Z) = AND2B(M124.Z-=A,M128.Z-=B);
    M326(CE-=Z) = ND3B(M299.Z-=B,M323.Z-=A,M325.Z-=C);

  /* extractors ******************************/

  /* type converters *********************/

ANNOTATIONS
{
  BUS BUS_TYPE = "DOT";
}

END MODULE;

/* * * * * * *  Contents of NET file MRGCNTV1FN.NET  * * * * * * */

/*******************************************************/
/*  Netlist copyright (C) 1989 LSI Logic Corporation  */
/*******************************************************/

MODULE MRGCNTV1FN;

INPUTS       CO,CP,CTEFF,CTONLY,FE,FNE,HDF,LS_1,LWONLY,OFF,REQ_O,
             RESET_,STF,WAIT;
OUTPUTS      CE,EN,FEAK_,LDC,LDH,LDK,LDM,LDY,MWAIT,RD_,WE;

LEVEL FUNCTION;
DEFINE
  /* implicit connectors *******************/

    MWAIT- = (MWAIT);
    WAIT- = (WAIT);
    STF- = (STF);
    REQ_O- = (REQ_O);
    OFF- = (OFF);
    LWONLY- = (LWONLY);
    HDF- = (HDF);
    FNE- = (FNE);
    FE- = (FE);
    CTONLY- = (CTONLY);
    CO- = (CO);
    FEAK_- = (FEAK_);
    WE- = (WE);
    LDM- = (LDM);
    LDH- = (LDH);
    LDK- = (LDK);
    LDC- = (LDC);
    CE- = (CE);
    LDY- = (LDY);
    EN- = (EN);
    RD_- = (RD_);
    RESET_- = (RESET_);
    RESET_- = (RESET_);
    CP- = (CP);
    CP- = (CP);
    LS_1- = (LS_1);
    CTEFF- = (CTEFF);
  /* part instances *************************/

    U2(RD_-=Q) = FD4A(U0.RD_-=D,CP-=CP,RESET_-=SD);
    U3.7(U3.QN-.7=QN,U3.Q-.7=Q) = FD2A(U3.D-.7=D,RESET_-=CD,CP-=CP);
    U3.6(U3.QN-.6=QN,U3.Q-.6=Q) = FD2A(U3.D-.6=D,RESET_-=CD,CP-=CP);
```

```
    U3.5(U3.QN-.5=QN,U3.Q-.5=Q) = FD2A(U3.D-.5=D,RESET_-=CD,CP-=CP);
    U3.4(U3.QN-.4=QN,U3.Q-.4=Q) = FD2A(U3.D-.4=D,RESET_-=CD,CP-=CP);
    U3.3(U3.QN-.3=QN,U3.Q-.3=Q) = FD2A(U3.D-.3=D,RESET_-=CD,CP-=CP);
    U3.2(U3.QN-.2=QN,U3.Q-.2=Q) = FD2A(U3.D-.2=D,RESET_-=CD,CP-=CP);
    U3.1(U3.QN-.1=QN,U3.Q-.1=Q) = FD2A(U3.D-.1=D,RESET_-=CD,CP-=CP);
    U3.0(U3.QN-.0=QN,U3.Q-.0=Q) = FD2A(U3.D-.0=D,RESET_-=CD,CP-=CP);
    U1.3(U1.Q-.3=Q) = FD2A(U1.D-.3=D,RESET_-=CD,CP-=CP);
    U1.2(U1.Q-.2=Q) = FD2A(U1.D-.2=D,RESET_-=CD,CP-=CP);
    U1.1(U1.Q-.1=Q) = FD2A(U1.D-.1=D,RESET_-=CD,CP-=CP);
    U1.0(U1.Q-.0=Q) = FD2A(U1.D-.0=D,RESET_-=CD,CP-=CP);
    U0(MWAIT-=MWAIT,U0.RD_-=RD_,U0.CE-=CE,U0.FEAK-=FEAK,U0.LDC-=LDC,
            U0.LDH-=LDH,U0.LDK-=LDK,U0.LDM-=LDM,U0.LDY-=LDY,EN-=WE,
            U0.STBIT0O-=STBIT0O,U0.STBIT1O-=STBIT1O,U0.STBIT2O-=STBIT2O,
            U0.STBIT3O-=STBIT3O) = MRGCNTV1CR(WAIT-=WAIT,STF-=STF,
            REQ_O-=REQ_O,OFF-=OFF,LWONLY-=LWONLY,HDF-=HDF,FNE-=FNE,
            FE-=FE,CTONLY-=CTONLY,CTEFF-=CTEFF,CO-=CO,U0.STBIT3I-=STBIT3I,
            U0.STBIT2I-=STBIT2I,U0.STBIT1I-=STBIT1I,U0.STBIT0I-=STBIT0I,
            LS_1-=LS_1);

  /* extractors *****************************/

    U1.D-.3 = (U0.STBIT3O-);
    U1.D-.2 = (U0.STBIT2O-);
    U1.D-.1 = (U0.STBIT1O-);
    U1.D-.0 = (U0.STBIT0O-);
    U3.QN-.0 = (FEAK_-);
    U3.Q-.6 = (WE-);
    U3.Q-.4 = (LDM-);
    U3.Q-.2 = (LDH-);
    U3.Q-.3 = (LDK-);
    U3.Q-.1 = (LDC-);
    U3.Q-.7 = (CE-);
    U3.Q-.5 = (LDY-);
    U3.D-.0 = (U0.FEAK-);
    U3.D-.7 = (U0.CE-);
    U3.D-.2 = (U0.LDH-);
    U3.D-.4 = (U0.LDM-);
    U3.D-.1 = (U0.LDC-);
    U3.D-.5 = (U0.LDY-);
    U3.D-.6 = (EN-);
    U3.D-.3 = (U0.LDK-);
    U1.Q-.2 = (U0.STBIT2I-);
    U1.Q-.1 = (U0.STBIT1I-);
    U1.Q-.3 = (U0.STBIT3I-);
    U1.Q-.0 = (U0.STBIT0I-);

  /* type converters *********************/

ANNOTATIONS
{
  BUS BUS_TYPE = "DOT";
}

END MODULE;

/* * * * * * *  Contents of NET file MRGRV1.NET  * * * * * * */

/*****************************************************/
/*  Netlist copyright (C) 1989 LSI Logic Corporation  */
/*****************************************************/

MODULE MRGRV1;

INPUTS      CNV.7,CNV.6,CNV.5,CNV.4,CNV.3,CNV.2,CNV.1,CNV.0,CP,
            FD.15,FD.14,FD.13,FD.12,FD.11,FD.10,FD.9,FD.8,FD.7,
            FD.6,FD.5,FD.4,FD.3,FD.2,FD.1,FD.0,NS.1,NS.0,OFF,
            RDY_F,REQ_O,RESET_,STF,WAIT;
OUTPUTS     DO.7,DO.6,DO.5,DO.4,DO.3,DO.2,DO.1,DO.0,MWAIT,RD_,
            SPR.1,SPR.0,WE;
```

```
LEVEL FUNCTION;
DEFINE
  /* implicit connectors *******************/

    MWAIT- = (MWAIT);
    WE- = (WE);
    RD_- = (RD_);
    REQ_O- = (REQ_O);
    RESET_- = (RESET_);
    BRESET_- = (BRESET_);
    BRESET_- = (BRESET_);
    HDF- = (HDF);
    HDF- = (HDF);
    CTONLY- = (CTONLY);
    CTONLY- = (CTONLY);
    LWONLY- = (LWONLY);
    LWONLY- = (LWONLY);
    CTEFF- = (CTEFF);
    CTEFF- = (CTEFF);
    U14.D- = (NC/1/);
    U11.G- = (NC/1/);
    BRESET_- = (BRESET_);
    FEAK_- = (FEAK_);
    FEAK_- = (FEAK_);
    RDY_F- = (RDY_F);
    BRESET_- = (BRESET_);
    CP- = (CP);
    CP- = (CP);
    CP- = (CP);
    BRESET_- = (BRESET_);
    LS- = (LS);
    LS- = (LS);
    OFF- = (OFF);
    OFF- = (OFF);
    BRESET_- = (BRESET_);
    DO-.7 = (DO.7);
    DO-.6 = (DO.6);
    DO-.5 = (DO.5);
    DO-.4 = (DO.4);
    DO-.3 = (DO.3);
    DO-.2 = (DO.2);
    DO-.1 = (DO.1);
    DO-.0 = (DO.0);
    CP- = (CP);
    BRESET_- = (BRESET_);
    LDC- = (LDC);
    LDC- = (LDC);
    CP- = (CP);
    BRESET_- = (BRESET_);
    LDM- = (LDM);
    LDM- = (LDM);
    CP- = (CP);
    FD-.15 = (FD.15);
    FD-.14 = (FD.14);
    FD-.13 = (FD.13);
    FD-.12 = (FD.12);
    FD-.11 = (FD.11);
    FD-.10 = (FD.10);
    FD-.9 = (FD.9);
    FD-.8 = (FD.8);
    FD-.7 = (FD.7);
    FD-.6 = (FD.6);
    FD-.5 = (FD.5);
    FD-.4 = (FD.4);
    FD-.3 = (FD.3);
    FD-.2 = (FD.2);
    FD-.1 = (FD.1);
    FD-.0 = (FD.0);
    FD-.15 = (FD.15);
    FD-.14 = (FD.14);
    FD-.13 = (FD.13);
    FD-.12 = (FD.12);
    FD-.11 = (FD.11);
    FD-.10 = (FD.10);
```

```
      FD-.9 = (FD.9);
      FD-.8 = (FD.8);
      FD-.7 = (FD.7);
      FD-.6 = (FD.6);
      FD-.5 = (FD.5);
      FD-.4 = (FD.4);
      FD-.3 = (FD.3);
      FD-.2 = (FD.2);
      FD-.1 = (FD.1);
      FD-.0 = (FD.0);
      BRESET_- = (BRESET_);
      CP- = (CP);
      LDK- = (LDK);
      LDK- = (LDK);
      BRESET_- = (BRESET_);
      LDY- = (LDY);
      LDY- = (LDY);
      CP- = (CP);
      SPR-.1 = (SPR.1);
      SPR-.0 = (SPR.0);
      SPR-.1 = (SPR.1);
      SPR-.0 = (SPR.0);
      CNV-.7 = (CNV.7);
      CNV-.6 = (CNV.6);
      CNV-.5 = (CNV.5);
      CNV-.4 = (CNV.4);
      CNV-.3 = (CNV.3);
      CNV-.2 = (CNV.2);
      CNV-.1 = (CNV.1);
      CNV-.0 = (CNV.0);
      BWAIT- = (BWAIT);
      WAIT- = (WAIT);
      WAIT- = (WAIT);
      BWAIT- = (BWAIT);
      BWAIT- = (BWAIT);
      NS-.1 = (NS.1);
      NS-.0 = (NS.0);
      CP- = (CP);
      CP- = (CP);
      LDH- = (LDH);
      LDH- = (LDH);
      LDH- = (LDH);
      BRESET_- = (BRESET_);
      BRESET_- = (BRESET_);
      STF- = (STF);


/* part instances ****************************/

  U15(BRESET_-=Z) = B3A(RESET_-=A);
  U12(U12.Z-=Z) = AND2B(BRESET_-=B,FEAK_-=A);
  U11(U11.Q-=Q) = LSR2B(U11.G-=R,U11.G-=S,U11.G-=G,U12.Z-=RD,
          RDY_F-=SD);
  U14(U14.Q-=Q) = FD2A(U12.Z-=CD,U14.D-=D,RDY_F-=CP);
  U13(U13.Z-=Z) = SYNC(CP-=CP,U12.Z-=SCLR_,U14.Q-=D,BRESET_-=RESET_);
  U9.15(U9.Q-.15=Q) = FD2SA(FD-.15=TI,BRESET_-=CD,U9.Q-.15=D,LDC-=TE,
          CP-=CP);
  U9.14(U9.Q-.14=Q) = FD2SA(FD-.14=TI,BRESET_-=CD,U9.Q-.14=D,LDC-=TE,
          CP-=CP);
  U9.13(U9.Q-.13=Q) = FD2SA(FD-.13=TI,BRESET_-=CD,U9.Q-.13=D,LDC-=TE,
          CP-=CP);
  U9.12(U9.Q-.12=Q) = FD2SA(FD-.12=TI,BRESET_-=CD,U9.Q-.12=D,LDC-=TE,
          CP-=CP);
  U9.11(U9.Q-.11=Q) = FD2SA(FD-.11=TI,BRESET_-=CD,U9.Q-.11=D,LDC-=TE,
          CP-=CP);
  U9.10(U9.Q-.10=Q) = FD2SA(FD-.10=TI,BRESET_-=CD,U9.Q-.10=D,LDC-=TE,
          CP-=CP);
  U9.9(U9.Q-.9=Q) = FD2SA(FD-.9=TI,BRESET_-=CD,U9.Q-.9=D,LDC-=TE,
          CP-=CP);
  U9.8(U9.Q-.8=Q) = FD2SA(FD-.8=TI,BRESET_-=CD,U9.Q-.8=D,LDC-=TE,
          CP-=CP);
  U9.7(U9.Q-.7=Q) = FD2SA(FD-.7=TI,BRESET_-=CD,U9.Q-.7=D,LDC-=TE,
          CP-=CP);
  U9.6(U9.Q-.6=Q) = FD2SA(FD-.6=TI,BRESET_-=CD,U9.Q-.6=D,LDC-=TE,
          CP-=CP);
```

```
U9.5(U9.Q-.5=Q) = FD2SA(FD-.5=TI,BRESET_-=CD,U9.Q-.5=D,LDC-=TE,
        CP-=CP);
U9.4(U9.Q-.4=Q) = FD2SA(FD-.4=TI,BRESET_-=CD,U9.Q-.4=D,LDC-=TE,
        CP-=CP);
U9.3(U9.Q-.3=Q) = FD2SA(FD-.3=TI,BRESET_-=CD,U9.Q-.3=D,LDC-=TE,
        CP-=CP);
U9.2(U9.Q-.2=Q) = FD2SA(FD-.2=TI,BRESET_-=CD,U9.Q-.2=D,LDC-=TE,
        CP-=CP);
U9.1(U9.Q-.1=Q) = FD2SA(FD-.1=TI,BRESET_-=CD,U9.Q-.1=D,LDC-=TE,
        CP-=CP);
U9.0(U9.Q-.0=Q) = FD2SA(FD-.0=TI,BRESET_-=CD,U9.Q-.0=D,LDC-=TE,
        CP-=CP);
U6.15(U6.Q-.15=Q) = FD2SA(FD-.15=TI,BRESET_-=CD,U6.Q-.15=D,LDM-=TE,
        CP-=CP);
U6.14(U6.Q-.14=Q) = FD2SA(FD-.14=TI,BRESET_-=CD,U6.Q-.14=D,LDM-=TE,
        CP-=CP);
U6.13(U6.Q-.13=Q) = FD2SA(FD-.13=TI,BRESET_-=CD,U6.Q-.13=D,LDM-=TE,
        CP-=CP);
U6.12(U6.Q-.12=Q) = FD2SA(FD-.12=TI,BRESET_-=CD,U6.Q-.12=D,LDM-=TE,
        CP-=CP);
U6.11(U6.Q-.11=Q) = FD2SA(FD-.11=TI,BRESET_-=CD,U6.Q-.11=D,LDM-=TE,
        CP-=CP);
U6.10(U6.Q-.10=Q) = FD2SA(FD-.10=TI,BRESET_-=CD,U6.Q-.10=D,LDM-=TE,
        CP-=CP);
U6.9(U6.Q-.9=Q) = FD2SA(FD-.9=TI,BRESET_-=CD,U6.Q-.9=D,LDM-=TE,
        CP-=CP);
U6.8(U6.Q-.8=Q) = FD2SA(FD-.8=TI,BRESET_-=CD,U6.Q-.8=D,LDM-=TE,
        CP-=CP);
U6.7(U6.Q-.7=Q) = FD2SA(FD-.7=TI,BRESET_-=CD,U6.Q-.7=D,LDM-=TE,
        CP-=CP);
U6.6(U6.Q-.6=Q) = FD2SA(FD-.6=TI,BRESET_-=CD,U6.Q-.6=D,LDM-=TE,
        CP-=CP);
U6.5(U6.Q-.5=Q) = FD2SA(FD-.5=TI,BRESET_-=CD,U6.Q-.5=D,LDM-=TE,
        CP-=CP);
U6.4(U6.Q-.4=Q) = FD2SA(FD-.4=TI,BRESET_-=CD,U6.Q-.4=D,LDM-=TE,
        CP-=CP);
U6.3(U6.Q-.3=Q) = FD2SA(FD-.3=TI,BRESET_-=CD,U6.Q-.3=D,LDM-=TE,
        CP-=CP);
U6.2(U6.Q-.2=Q) = FD2SA(FD-.2=TI,BRESET_-=CD,U6.Q-.2=D,LDM-=TE,
        CP-=CP);
U6.1(U6.Q-.1=Q) = FD2SA(FD-.1=TI,BRESET_-=CD,U6.Q-.1=D,LDM-=TE,
        CP-=CP);
U6.0(U6.Q-.0=Q) = FD2SA(FD-.0=TI,BRESET_-=CD,U6.Q-.0=D,LDM-=TE,
        CP-=CP);
U5.15(U5.Q-.15=Q) = FD2SA(FD-.15=TI,BRESET_-=CD,U5.Q-.15=D,CP-=CP,
        LDK-=TE);
U5.14(U5.Q-.14=Q) = FD2SA(FD-.14=TI,BRESET_-=CD,U5.Q-.14=D,CP-=CP,
        LDK-=TE);
U5.13(U5.Q-.13=Q) = FD2SA(FD-.13=TI,BRESET_-=CD,U5.Q-.13=D,CP-=CP,
        LDK-=TE);
U5.12(U5.Q-.12=Q) = FD2SA(FD-.12=TI,BRESET_-=CD,U5.Q-.12=D,CP-=CP,
        LDK-=TE);
U5.11(U5.Q-.11=Q) = FD2SA(FD-.11=TI,BRESET_-=CD,U5.Q-.11=D,CP-=CP,
        LDK-=TE);
U5.10(U5.Q-.10=Q) = FD2SA(FD-.10=TI,BRESET_-=CD,U5.Q-.10=D,CP-=CP,
        LDK-=TE);
U5.9(U5.Q-.9=Q) = FD2SA(FD-.9=TI,BRESET_-=CD,U5.Q-.9=D,CP-=CP,
        LDK-=TE);
U5.8(U5.Q-.8=Q) = FD2SA(FD-.8=TI,BRESET_-=CD,U5.Q-.8=D,CP-=CP,
        LDK-=TE);
U5.7(U5.Q-.7=Q) = FD2SA(FD-.7=TI,BRESET_-=CD,U5.Q-.7=D,CP-=CP,
        LDK-=TE);
U5.6(U5.Q-.6=Q) = FD2SA(FD-.6=TI,BRESET_-=CD,U5.Q-.6=D,CP-=CP,
        LDK-=TE);
U5.5(U5.Q-.5=Q) = FD2SA(FD-.5=TI,BRESET_-=CD,U5.Q-.5=D,CP-=CP,
        LDK-=TE);
U5.4(U5.Q-.4=Q) = FD2SA(FD-.4=TI,BRESET_-=CD,U5.Q-.4=D,CP-=CP,
        LDK-=TE);
U5.3(U5.Q-.3=Q) = FD2SA(FD-.3=TI,BRESET_-=CD,U5.Q-.3=D,CP-=CP,
        LDK-=TE);
U5.2(U5.Q-.2=Q) = FD2SA(FD-.2=TI,BRESET_-=CD,U5.Q-.2=D,CP-=CP,
        LDK-=TE);
U5.1(U5.Q-.1=Q) = FD2SA(FD-.1=TI,BRESET_-=CD,U5.Q-.1=D,CP-=CP,
        LDK-=TE);
```

```
U5.0(U5.Q-.0=Q) = FD2SA(FD-.0=TI,BRESET_-=CD,U5.Q-.0=D,CP-=CP,
        LDK-=TE);
U4.15(U4.Q-.15=Q) = FD2SA(FD-.15=TI,BRESET_-=CD,U4.Q-.15=D,LDY-=TE,
        CP-=CP);
U4.14(U4.Q-.14=Q) = FD2SA(FD-.14=TI,BRESET_-=CD,U4.Q-.14=D,LDY-=TE,
        CP-=CP);
U4.13(U4.Q-.13=Q) = FD2SA(FD-.13=TI,BRESET_-=CD,U4.Q-.13=D,LDY-=TE,
        CP-=CP);
U4.12(U4.Q-.12=Q) = FD2SA(FD-.12=TI,BRESET_-=CD,U4.Q-.12=D,LDY-=TE,
        CP-=CP);
U4.11(U4.Q-.11=Q) = FD2SA(FD-.11=TI,BRESET_-=CD,U4.Q-.11=D,LDY-=TE,
        CP-=CP);
U4.10(U4.Q-.10=Q) = FD2SA(FD-.10=TI,BRESET_-=CD,U4.Q-.10=D,LDY-=TE,
        CP-=CP);
U4.9(U4.Q-.9=Q) = FD2SA(FD-.9=TI,BRESET_-=CD,U4.Q-.9=D,LDY-=TE,
        CP-=CP);
U4.8(U4.Q-.8=Q) = FD2SA(FD-.8=TI,BRESET_-=CD,U4.Q-.8=D,LDY-=TE,
        CP-=CP);
U4.7(U4.Q-.7=Q) = FD2SA(FD-.7=TI,BRESET_-=CD,U4.Q-.7=D,LDY-=TE,
        CP-=CP);
U4.6(U4.Q-.6=Q) = FD2SA(FD-.6=TI,BRESET_-=CD,U4.Q-.6=D,LDY-=TE,
        CP-=CP);
U4.5(U4.Q-.5=Q) = FD2SA(FD-.5=TI,BRESET_-=CD,U4.Q-.5=D,LDY-=TE,
        CP-=CP);
U4.4(U4.Q-.4=Q) = FD2SA(FD-.4=TI,BRESET_-=CD,U4.Q-.4=D,LDY-=TE,
        CP-=CP);
U4.3(U4.Q-.3=Q) = FD2SA(FD-.3=TI,BRESET_-=CD,U4.Q-.3=D,LDY-=TE,
        CP-=CP);
U4.2(U4.Q-.2=Q) = FD2SA(FD-.2=TI,BRESET_-=CD,U4.Q-.2=D,LDY-=TE,
        CP-=CP);
U4.1(U4.Q-.1=Q) = FD2SA(FD-.1=TI,BRESET_-=CD,U4.Q-.1=D,LDY-=TE,
        CP-=CP);
U4.0(U4.Q-.0=Q) = FD2SA(FD-.0=TI,BRESET_-=CD,U4.Q-.0=D,LDY-=TE,
        CP-=CP);
U3.15(U3.Z-.15=Z) = MUX41B(U9.Q-.15=D0,U5.Q-.15=D3,U6.Q-.15=D1,
        U4.Q-.15=D2,U3.B-=B,U3.A-=A);
U3.14(U3.Z-.14=Z) = MUX41B(U9.Q-.14=D0,U5.Q-.14=D3,U6.Q-.14=D1,
        U4.Q-.14=D2,U3.B-=B,U3.A-=A);
U3.13(U3.Z-.13=Z) = MUX41B(U9.Q-.13=D0,U5.Q-.13=D3,U6.Q-.13=D1,
        U4.Q-.13=D2,U3.B-=B,U3.A-=A);
U3.12(U3.Z-.12=Z) = MUX41B(U9.Q-.12=D0,U5.Q-.12=D3,U6.Q-.12=D1,
        U4.Q-.12=D2,U3.B-=B,U3.A-=A);
U3.11(U3.Z-.11=Z) = MUX41B(U9.Q-.11=D0,U5.Q-.11=D3,U6.Q-.11=D1,
        U4.Q-.11=D2,U3.B-=B,U3.A-=A);
U3.10(U3.Z-.10=Z) = MUX41B(U9.Q-.10=D0,U5.Q-.10=D3,U6.Q-.10=D1,
        U4.Q-.10=D2,U3.B-=B,U3.A-=A);
U3.9(U3.Z-.9=Z) = MUX41B(U9.Q-.9=D0,U5.Q-.9=D3,U6.Q-.9=D1,
        U4.Q-.9=D2,U3.B-=B,U3.A-=A);
U3.8(U3.Z-.8=Z) = MUX41B(U9.Q-.8=D0,U5.Q-.8=D3,U6.Q-.8=D1,
        U4.Q-.8=D2,U3.B-=B,U3.A-=A);
U3.7(U3.Z-.7=Z) = MUX41B(U9.Q-.7=D0,U5.Q-.7=D3,U6.Q-.7=D1,
        U4.Q-.7=D2,U3.B-=B,U3.A-=A);
U3.6(U3.Z-.6=Z) = MUX41B(U9.Q-.6=D0,U5.Q-.6=D3,U6.Q-.6=D1,
        U4.Q-.6=D2,U3.B-=B,U3.A-=A);
U3.5(U3.Z-.5=Z) = MUX41B(U9.Q-.5=D0,U5.Q-.5=D3,U6.Q-.5=D1,
        U4.Q-.5=D2,U3.B-=B,U3.A-=A);
U3.4(U3.Z-.4=Z) = MUX41B(U9.Q-.4=D0,U5.Q-.4=D3,U6.Q-.4=D1,
        U4.Q-.4=D2,U3.B-=B,U3.A-=A);
U3.3(U3.Z-.3=Z) = MUX41B(U9.Q-.3=D0,U5.Q-.3=D3,U6.Q-.3=D1,
        U4.Q-.3=D2,U3.B-=B,U3.A-=A);
U3.2(U3.Z-.2=Z) = MUX41B(U9.Q-.2=D0,U5.Q-.2=D3,U6.Q-.2=D1,
        U4.Q-.2=D2,U3.B-=B,U3.A-=A);
U3.1(U3.Z-.1=Z) = MUX41B(U9.Q-.1=D0,U5.Q-.1=D3,U6.Q-.1=D1,
        U4.Q-.1=D2,U3.B-=B,U3.A-=A);
U3.0(U3.Z-.0=Z) = MUX41B(U9.Q-.0=D0,U5.Q-.0=D3,U6.Q-.0=D1,
        U4.Q-.0=D2,U3.B-=B,U3.A-=A);
U1(DO-.7=Z.7,DO-.6=Z.6,DO-.5=Z.5,DO-.4=Z.4,DO-.3=Z.3,DO-.2=Z.2,
        DO-.1=Z.1,DO-.0=Z.0) = FRMLV2(BRESET_-=RESET_,CP-=CP,
        BWAIT-=WAIT,U1.SC-.7=SC.7,U1.SC-.6=SC.6,U1.SC-.5=SC.5,
        U1.SC-.4=SC.4,U1.SC-.3=SC.3,U1.SC-.2=SC.2,U1.SC-.1=SC.1,
        U1.SC-.0=SC.0,U1.LWS-.7=LWS.7,U1.LWS-.6=LWS.6,
        U1.LWS-.5=LWS.5,U1.LWS-.4=LWS.4,U1.LWS-.3=LWS.3,
        U1.LWS-.2=LWS.2,U1.LWS-.1=LWS.1,U1.LWS-.0=LWS.0,
        CNV-.7=CT.7,CNV-.6=CT.6,CNV-.5=CT.5,CNV-.4=CT.4,
        CNV-.3=CT.3,CNV-.2=CT.2,CNV-.1=CT.1,CNV-.0=CT.0);
```

```
U2(BWAIT-=Z) = B3A(WAIT-=A);
U16(U16.Z-=Z) = OR2B(OFF-=B,BWAIT-=A);
U0(LS-=LS_1,SPR-.1=SPR.1,SPR-.0=SPR.0) = OSSV1FN(BRESET_-=RESET_,
        U8.EN-=EN,U16.Z-=WAIT,CP-=CP,NS-.1=NS.1,NS-.0=NS.0);
U10.7(U10.Q-.15=Q) = FD2SA(U10.Q-.15=D,U10.TI-.7=TI,BRESET_-=CD,
        CP-=CP,LDH-=TE);
U10.6(U10.Q-.14=Q) = FD2SA(U10.Q-.14=D,U10.TI-.6=TI,BRESET_-=CD,
        CP-=CP,LDH-=TE);
U10.5(U10.Q-.13=Q) = FD2SA(U10.Q-.13=D,U10.TI-.5=TI,BRESET_-=CD,
        CP-=CP,LDH-=TE);
U10.4(U10.Q-.12=Q) = FD2SA(U10.Q-.12=D,U10.TI-.4=TI,BRESET_-=CD,
        CP-=CP,LDH-=TE);
U10.3(U10.Q-.11=Q) = FD2SA(U10.Q-.11=D,U10.TI-.3=TI,BRESET_-=CD,
        CP-=CP,LDH-=TE);
U10.2(U10.Q-.10=Q) = FD2SA(U10.Q-.10=D,U10.TI-.2=TI,BRESET_-=CD,
        CP-=CP,LDH-=TE);
U10.1(U10.Q-.9=Q) = FD2SA(U10.Q-.9=D,U10.TI-.1=TI,BRESET_-=CD,
        CP-=CP,LDH-=TE);
U10.0(U10.Q-.8=Q) = FD2SA(U10.Q-.8=D,U10.TI-.0=TI,BRESET_-=CD,
        CP-=CP,LDH-=TE);
U7(U7.CO-=CO) = CNTR8D(U8.CE-=CE,BRESET_-=RESET_,U7.D-.7=D.7,
        U7.D-.6=D.6,U7.D-.5=D.5,U7.D-.4=D.4,U7.D-.3=D.3,
        U7.D-.2=D.2,U7.D-.1=D.1,U7.D-.0=D.0,CP-=CP,LDH-=LD);
U8(MWAIT-=MWAIT,WE-=WE,U8.EN-=EN,U8.CE-=CE,FEAK_-=FEAK_,LDK-=LDK,
        LDY-=LDY,LDM-=LDM,LDC-=LDC,LDH-=LDH,RD_-=RD_) =
        MRGCNTV1FN(LWONLY-=LWONLY,CTONLY-=CTONLY,CTEFF-=CTEFF,
        U13.Z-=FNE,U11.Q-=FE,OFF-=OFF,STF-=STF,WAIT-=WAIT,
        REQ_O-=REQ_O,HDF-=HDF,LS-=LS_1,CP-=CP,U7.CO-=CO,
        BRESET_-=RESET_);


/* extractors *****************************/

  U10.Q-.15 = (HDF-);
  U10.Q-.10 = (CTONLY-);
  U10.Q-.9 = (LWONLY-);
  U10.Q-.8 = (CTEFF-);
  FD-.15 = (U10.TI-.7);
  FD-.14 = (U10.TI-.6);
  FD-.13 = (U10.TI-.5);
  FD-.12 = (U10.TI-.4);
  FD-.11 = (U10.TI-.3);
  FD-.10 = (U10.TI-.2);
  FD-.9 = (U10.TI-.1);
  FD-.8 = (U10.TI-.0);
  FD-.7 = (U7.D-.7);
  FD-.6 = (U7.D-.6);
  FD-.5 = (U7.D-.5);
  FD-.4 = (U7.D-.4);
  FD-.3 = (U7.D-.3);
  FD-.2 = (U7.D-.2);
  FD-.1 = (U7.D-.1);
  FD-.0 = (U7.D-.0);
  SPR-.1 = (U3.B-);
  SPR-.0 = (U3.A-);
  U3.Z-.15 = (U1.SC-.7);
  U3.Z-.14 = (U1.SC-.6);
  U3.Z-.13 = (U1.SC-.5);
  U3.Z-.12 = (U1.SC-.4);
  U3.Z-.11 = (U1.SC-.3);
  U3.Z-.10 = (U1.SC-.2);
  U3.Z-.9 = (U1.SC-.1);
  U3.Z-.8 = (U1.SC-.0);
  U3.Z-.7 = (U1.LWS-.7);
  U3.Z-.6 = (U1.LWS-.6);
  U3.Z-.5 = (U1.LWS-.5);
  U3.Z-.4 = (U1.LWS-.4);
  U3.Z-.3 = (U1.LWS-.3);
  U3.Z-.2 = (U1.LWS-.2);
  U3.Z-.1 = (U1.LWS-.1);
  U3.Z-.0 = (U1.LWS-.0);


/* type converters *********************/
```

```
ANNOTATIONS
{
  BUS BUS_TYPE = "DOT";
}

END MODULE;


/* * * * * * *  Contents of NET file SRDLYAV.NET  * * * * * * */

/*******************************************************/
/*  Netlist copyright (C) 1989 LSI Logic Corporation  */
/*******************************************************/


MODULE SRDLYAV;

INPUTS      CP,D,DLY_POL,NOS.1,NOS.0,RESET_,WAIT;
OUTPUTS     Q0,QD;

LEVEL FUNCTION;
DEFINE
  /* implicit connectors *******************/

    QD- = (QD);
    DLY_POL- = (DLY_POL);
    NOS-.1 = (NOS.1);
    NOS-.0 = (NOS.0);
    D- = (D);
    D- = (D);
    Q0- = (Q0);
    CP- = (CP);
    WAIT- = (WAIT);
    RESET_- = (RESET_);


  /* part instances **************************/

    U1(QD-=Z) = MUX81HB(DLY_POL-=A,U1.C-=C,U1.B-=B,D-=D0,U1.D7-=D7,
            U1.D6-=D6,U1.D5-=D5,U1.D4-=D4,U1.D3-=D3,U1.D2-=D2,Q0-=D1);
    U0(U0.Z-=Z) = B3A(WAIT-=A);
    U2.19(U2.Q-.19=Q) = FD2SA(U2.D-.19=D,U2.Q-.19=TI,CP-=CP,RESET_-=CD,
            U0.Z-=TE);
    U2.18(U2.Q-.18=Q) = FD2SA(U2.D-.18=D,U2.Q-.18=TI,CP-=CP,RESET_-=CD,
            U0.Z-=TE);
    U2.17(U2.Q-.17=Q) = FD2SA(U2.D-.17=D,U2.Q-.17=TI,CP-=CP,RESET_-=CD,
            U0.Z-=TE);
    U2.16(U2.Q-.16=Q) = FD2SA(U2.D-.16=D,U2.Q-.16=TI,CP-=CP,RESET_-=CD,
            U0.Z-=TE);
    U2.15(U2.Q-.15=Q) = FD2SA(U2.D-.15=D,U2.Q-.15=TI,CP-=CP,RESET_-=CD,
            U0.Z-=TE);
    U2.14(U2.Q-.14=Q) = FD2SA(U2.D-.14=D,U2.Q-.14=TI,CP-=CP,RESET_-=CD,
            U0.Z-=TE);
    U2.13(U2.Q-.13=Q) = FD2SA(U2.D-.13=D,U2.Q-.13=TI,CP-=CP,RESET_-=CD,
            U0.Z-=TE);
    U2.12(U2.Q-.12=Q) = FD2SA(U2.D-.12=D,U2.Q-.12=TI,CP-=CP,RESET_-=CD,
            U0.Z-=TE);
    U2.11(U2.Q-.11=Q) = FD2SA(U2.D-.11=D,U2.Q-.11=TI,CP-=CP,RESET_-=CD,
            U0.Z-=TE);
    U2.10(U2.Q-.10=Q) = FD2SA(U2.D-.10=D,U2.Q-.10=TI,CP-=CP,RESET_-=CD,
            U0.Z-=TE);
    U2.9(U2.Q-.9=Q) = FD2SA(U2.D-.9=D,U2.Q-.9=TI,CP-=CP,RESET_-=CD,
            U0.Z-=TE);
    U2.8(U2.Q-.8=Q) = FD2SA(U2.D-.8=D,U2.Q-.8=TI,CP-=CP,RESET_-=CD,
            U0.Z-=TE);
    U2.7(U2.Q-.7=Q) = FD2SA(U2.D-.7=D,U2.Q-.7=TI,CP-=CP,RESET_-=CD,
            U0.Z-=TE);
    U2.6(U2.Q-.6=Q) = FD2SA(U2.D-.6=D,U2.Q-.6=TI,CP-=CP,RESET_-=CD,
            U0.Z-=TE);
    U2.5(U2.Q-.5=Q) = FD2SA(U2.D-.5=D,U2.Q-.5=TI,CP-=CP,RESET_-=CD,
            U0.Z-=TE);
    U2.4(U2.Q-.4=Q) = FD2SA(U2.D-.4=D,U2.Q-.4=TI,CP-=CP,RESET_-=CD,
            U0.Z-=TE);
```

```
U2.3(U2.Q-.3=Q) = FD2SA(U2.D-.3=D,U2.Q-.3=TI,CP-=CP,RESET_-=CD,
        U0.Z-=TE);
U2.2(U2.Q-.2=Q) = FD2SA(U2.D-.2=D,U2.Q-.2=TI,CP-=CP,RESET_-=CD,
        U0.Z-=TE);
U2.1(U2.Q-.1=Q) = FD2SA(U2.D-.1=D,U2.Q-.1=TI,CP-=CP,RESET_-=CD,
        U0.Z-=TE);
U2.0(U2.Q-.0=Q) = FD2SA(U2.D-.0=D,U2.Q-.0=TI,CP-=CP,RESET_-=CD,
        U0.Z-=TE);

/* extractors ******************************/

NOS-.1 = (U1.C-);
NOS-.0 = (U1.B-);
U2.Q-.18 = (M-0.18);
U2.Q-.17 = (M-0.17);
U2.Q-.16 = (M-0.16);
U2.Q-.15 = (M-0.15);
U2.Q-.14 = (M-0.14);
U2.Q-.13 = (M-0.13);
U2.Q-.12 = (M-0.12);
U2.Q-.11 = (M-0.11);
U2.Q-.10 = (M-0.10);
U2.Q-.9 = (M-0.9);
U2.Q-.8 = (M-0.8);
U2.Q-.7 = (M-0.7);
U2.Q-.6 = (M-0.6);
U2.Q-.5 = (M-0.5);
U2.Q-.4 = (M-0.4);
U2.Q-.3 = (M-0.3);
U2.Q-.2 = (M-0.2);
U2.Q-.1 = (M-0.1);
U2.Q-.0 = (M-0.0);
U2.D-.19 = (M-0.18);
U2.D-.18 = (M-0.17);
U2.D-.17 = (M-0.16);
U2.D-.16 = (M-0.15);
U2.D-.15 = (M-0.14);
U2.D-.14 = (M-0.13);
U2.D-.13 = (M-0.12);
U2.D-.12 = (M-0.11);
U2.D-.11 = (M-0.10);
U2.D-.10 = (M-0.9);
U2.D-.9 = (M-0.8);
U2.D-.8 = (M-0.7);
U2.D-.7 = (M-0.6);
U2.D-.6 = (M-0.5);
U2.D-.5 = (M-0.4);
U2.D-.4 = (M-0.3);
U2.D-.3 = (M-0.2);
U2.D-.2 = (M-0.1);
U2.D-.1 = (M-0.0);
U2.D-.0 = (D-);
U2.Q-.15 = (U1.D6-);
U2.Q-.13 = (U1.D5-);
U2.Q-.10 = (U1.D4-);
U2.Q-.6 = (U1.D3-);
U2.Q-.5 = (U1.D2-);
U2.Q-.1 = (Q0-);
U2.Q-.19 = (U1.D7-);

/* type converters *********************/

ANNOTATIONS
{
  BUS BUS_TYPE = "DOT";
}

END MODULE;


/* * * * * * *  Contents of NET file ADD13F.NET  * * * * * * */
```

```
/*******************************************************/
/*  Netlist copyright (C) 1989 LSI Logic Corporation  */
/*******************************************************/


MODULE ADD13F;

INPUTS      A.12,A.11,A.10,A.9,A.8,A.7,A.6,A.5,A.4,A.3,A.2,A.1,
            A.0,B.12,B.11,B.10,B.9,B.8,B.7,B.6,B.5,B.4,B.3,B.2,
            B.1,B.0;
OUTPUTS     S.13,S.12,S.11,S.10,S.9,S.8,S.7,S.6,S.5,S.4,S.3,S.2,
            S.1,S.0;

LEVEL FUNCTION;
DEFINE
  /* implicit connectors *******************/

    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);


/* part instances ***************************/

  U5(U5.Z-=Z) = AND2B(U4.P-=A,U7.P-=B);
  U11(U11.Z-=Z) = N1B(U10.Z-=A);
  U9(U9.Z-=Z) = ND2C(U6.Z-=A,U11.Z-=B);
  U6(U6.Z-=Z) = ND2B(U5.Z-=B,U15.Z-=A);
  U14(U14.Z-=Z) = N1C(U0.G-=A);
  U15(U15.Z-=Z) = ND2C(U14.Z-=B,U13.Z-=A);
  U13(U13.Z-=Z) = ND2C(U0.P-=B,U1.G-=A);
  U1(U1.G-=G,U1.SUM3-=SUM3,U1.SUM2-=SUM2,U1.SUM1-=SUM1,U1.SUM0-=SUM0)
          = ADD15F0_SEL4(U1.A0-=A0,U1.A1-=A1,U1.A2-=A2,U1.A3-=A3,
          U1.B0-=B0,U1.B1-=B1,U1.B2-=B2,U1.B3-=B3);
  U7(U7.SUM0-=SUM0,U7.G-=G,U7.P-=P) = ADD_SEL1(U3.Z-=CI,U7.A0-=A0,
          U7.B0-=B0);
  U12(U12.Z-=Z) = N1C(U7.G-=A);
```

```
U10(U10.Z-=Z) = ND2C(U12.Z-=B,U8.Z-=A);
U8(U8.Z-=Z) = ND2C(U4.G-=A,U7.P-=B);
U16(U16.Z-=Z) = N1A(U4.G-=A);
U3(U3.Z-=Z) = ND2B(U16.Z-=B,U2.Z-=A);
U2(U2.Z-=Z) = ND2B(U4.P-=B,U15.Z-=A);
U4(U4.SUM1-=SUM1,U4.SUM2-=SUM2,U4.SUM3-=SUM3,U4.SUM0-=SUM0,
        U4.G-=G,U4.P-=P) = ADD_SEL4(U15.Z-=CI,U4.B3-=B3,U4.B1-=B1,
        U4.B2-=B2,U4.B0-=B0,U4.A0-=A0,U4.A1-=A1,U4.A2-=A2,
        U4.A3-=A3);
U0(U0.SUM1-=SUM1,U0.SUM2-=SUM2,U0.SUM0-=SUM0,U0.G-=G,U0.P-=P,
        U0.SUM3-=SUM3) = ADD_SEL4(U1.G-=CI,U0.B1-=B1,U0.B2-=B2,
        U0.B3-=B3,U0.B0-=B0,U0.A0-=A0,U0.A1-=A1,U0.A2-=A2,
        U0.A3-=A3);

/* extractors *******************************/

 A-.4 = (U0.A0-);
 A-.6 = (U0.A2-);
 A-.7 = (U0.A3-);
 M-0.4 = (U0.SUM0-);
 M-0.6 = (U0.SUM2-);
 M-0.5 = (U0.SUM1-);
 M-0.9 = (U4.SUM1-);
 M-0.11 = (U4.SUM3-);
 M-0.8 = (U4.SUM0-);
 M-0.12 = (U7.SUM0-);
 A-.12 = (U7.A0-);
 B-.8 = (U4.B0-);
 B-.11 = (U4.B3-);
 B-.4 = (U0.B0-);
 B-.9 = (U4.B1-);
 B-.6 = (U0.B2-);
 B-.7 = (U0.B3-);
 B-.10 = (U4.B2-);
 B-.5 = (U0.B1-);
 S-.12 = (M-0.12);
 S-.11 = (M-0.11);
 S-.10 = (M-0.10);
 S-.9 = (M-0.9);
 S-.8 = (M-0.8);
 S-.7 = (M-0.7);
 S-.6 = (M-0.6);
 S-.5 = (M-0.5);
 S-.4 = (M-0.4);
 S-.3 = (M-0.3);
 S-.2 = (M-0.2);
 S-.1 = (M-0.1);
 S-.0 = (M-0.0);
 S-.13 = (U9.Z-);
 A-.0 = (U1.A0-);
 A-.1 = (U1.A1-);
 A-.2 = (U1.A2-);
 A-.3 = (U1.A3-);
 B-.0 = (U1.B0-);
 B-.1 = (U1.B1-);
 B-.3 = (U1.B3-);
 M-0.3 = (U1.SUM3-);
 M-0.2 = (U1.SUM2-);
 M-0.1 = (U1.SUM1-);
 M-0.0 = (U1.SUM0-);
 B-.2 = (U1.B2-);
 B-.12 = (U7.B0-);
 A-.8 = (U4.A0-);
 A-.9 = (U4.A1-);
 A-.10 = (U4.A2-);
 A-.11 = (U4.A3-);
 M-0.10 = (U4.SUM2-);
 M-0.7 = (U0.SUM3-);
 A-.5 = (U0.A1-);

/* type converters *********************/
```

```
ANNOTATIONS
{
  BUS BUS_TYPE = "DOT";
}

END MODULE;


/* * * * * * *  Contents of NET file ADD_SEL1.NET  * * * * * * */

/*******************************************************/
/*  Netlist copyright (C) 1989 LSI Logic Corporation  */
/*******************************************************/


MODULE ADD_SEL1;
INPUTS       A0,B0,CI;
OUTPUTS      G,P,SUM0;

LEVEL FUNCTION;
DEFINE
  /* implicit connectors *******************/

    SUM0- = (SUM0);
    G- = (G);
    A0- = (A0);
    B0- = (B0);
    P- = (P);
    CI- = (CI);


  /* part instances **************************/

    U15(G-=Z) = N1C(U12.Z-=A);
    U12(U12.Z-=Z) = ND2C(B0-=B,A0-=A);
    U10(U10.Z-=Z) = NR2C(A0-=A,B0-=B);
    U11(P-=Z) = N1B(U10.Z-=A);
    U1(U1.Z-=Z) = N1B(U10.Z-=A);
    U2(U2.Z-=Z) = ND2B(U12.Z-=A,U1.Z-=B);
    U3(U3.Z-=Z) = N1C(U2.Z-=A);
    U7(SUM0-=Z) = MX21LB(U0.Z-=S,U3.Z-=A,U2.Z-=B);
    U0(U0.Z-=Z) = N1D(CI-=A);


  /* extractors *****************************/


  /* type converters *********************/

ANNOTATIONS
{
  BUS BUS_TYPE = "DOT";
}

END MODULE;


/* * * * * * *  Contents of NET file ADD15F.NET  * * * * * * */

/*******************************************************/
/*  Netlist copyright (C) 1989 LSI Logic Corporation  */
/*******************************************************/


MODULE ADD15F;

INPUTS       A.14,A.13,A.12,A.11,A.10,A.9,A.8,A.7,A.6,A.5,A.4,A.3,
             A.2,A.1,A.0,B.14,B.13,B.12,B.11,B.10,B.9,B.8,B.7,B.6,
             B.5,B.4,B.3,B.2,B.1,B.0;
OUTPUTS      S.15,S.14,S.13,S.12,S.11,S.10,S.9,S.8,S.7,S.6,S.5,S.4,
             S.3,S.2,S.1,S.0;
```

```
LEVEL FUNCTION;
DEFINE
  /* implicit connectors *******************/

    S-.15 = (S.15);
    S-.14 = (S.14);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    B-.14 = (B.14);
    B-.13 = (B.13);
    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);


/* part instances **************************/

  U15(U15.Z-=Z) = ND2C(U0.G-=A,U18.P-=B);
  U10(U10.Z-=Z) = N1C(U9.G-=A);
  U8(U8.Z-=Z) = N1B(U7.Z-=A);
  U7(U7.Z-=Z) = ND2C(U6.Z-=A,U10.Z-=B);
  U6(U6.Z-=Z) = ND2C(U9.P-=B,U1.G-=A);
  U12(U12.Z-=Z) = ND2B(U16.Z-=A,U1.P-=B);
  U2(U2.Z-=Z) = AND2B(U9.P-=B,U1.P-=A);
  U5(U5.Z-=Z) = ND2B(U16.Z-=A,U2.Z-=B);
  U4(U4.Z-=Z) = ND2C(U8.Z-=B,U5.Z-=A);
  U0(U0.SUM0-=SUM0,U0.SUM1-=SUM1,U0.SUM2-=SUM2,U0.SUM3-=SUM3,
          U0.G-=G) = ADD15F0_SEL4(U0.B3-=B3,U0.B2-=B2,U0.B1-=B1,
          U0.B0-=B0,U0.A3-=A3,U0.A2-=A2,U0.A1-=A1,U0.A0-=A0);
  U18(U18.SUM3-=SUM3,U18.P-=P,U18.G-=G,U18.SUM0-=SUM0,U18.SUM2-=SUM2,
          U18.SUM1-=SUM1) = ADD_SEL4(U18.A3-=A3,U18.A2-=A2,
          U18.A1-=A1,U18.A0-=A0,U18.B0-=B0,U18.B3-=B3,U18.B2-=B2,
          U18.B1-=B1,U0.G-=CI);
  U17(U17.Z-=Z) = N1C(U18.G-=A);
  U16(U16.Z-=Z) = ND2C(U15.Z-=A,U17.Z-=B);
  U1(U1.P-=P,U1.G-=G,U1.SUM0-=SUM0,U1.SUM3-=SUM3,U1.SUM2-=SUM2,
          U1.SUM1-=SUM1) = ADD_SEL4(U1.A3-=A3,U1.A2-=A2,U1.A1-=A1,
          U1.A0-=A0,U1.B0-=B0,U1.B2-=B2,U1.B1-=B1,U1.B3-=B3,
          U16.Z-=CI);
```

```
U13(U13.Z-=Z) = N1A(U1.G-=A);
U11(U11.Z-=Z) = ND2B(U12.Z-=A,U13.Z-=B);
U9(U9.P-=P,U9.G-=G,U9.SUM0-=SUM0,U9.SUM2-=SUM2,U9.SUM1-=SUM1)
        = ADD15F_SEL3(U9.B0-=B0,U9.B1-=B1,U9.B2-=B2,U9.A2-=A2,
        U9.A1-=A1,U9.A0-=A0,U11.Z-=CI);


/* extractors ******************************/

A-.14 = (U9.A2-);
A-.13 = (U9.A1-);
A-.11 = (U1.A3-);
A-.10 = (U1.A2-);
A-.9 = (U1.A1-);
A-.8 = (U1.A0-);
A-.7 = (U18.A3-);
A-.6 = (U18.A2-);
A-.5 = (U18.A1-);
A-.4 = (U18.A0-);
M-0.10 = (U1.SUM2-);
M-0.8 = (U1.SUM0-);
M-0.4 = (U18.SUM0-);
M-0.12 = (U9.SUM0-);
M-0.5 = (U18.SUM1-);
M-0.1 = (U0.SUM1-);
M-0.2 = (U0.SUM2-);
M-0.0 = (U0.SUM0-);
S-.15 = (U4.Z-);
S-.14 = (M-0.14);
S-.13 = (M-0.13);
S-.12 = (M-0.12);
S-.11 = (M-0.11);
S-.10 = (M-0.10);
S-.9 = (M-0.9);
S-.8 = (M-0.8);
S-.7 = (M-0.7);
S-.6 = (M-0.6);
S-.5 = (M-0.5);
S-.4 = (M-0.4);
S-.3 = (M-0.3);
S-.2 = (M-0.2);
S-.1 = (M-0.1);
S-.0 = (M-0.0);
M-0.14 = (U9.SUM2-);
M-0.9 = (U1.SUM1-);
M-0.7 = (U18.SUM3-);
M-0.11 = (U1.SUM3-);
M-0.13 = (U9.SUM1-);
M-0.6 = (U18.SUM2-);
M-0.3 = (U0.SUM3-);
B-.3 = (U0.B3-);
B-.7 = (U18.B3-);
B-.14 = (U9.B2-);
B-.2 = (U0.B2-);
B-.1 = (U0.B1-);
B-.9 = (U1.B1-);
B-.11 = (U1.B3-);
B-.8 = (U1.B0-);
B-.10 = (U1.B2-);
B-.12 = (U9.B0-);
B-.6 = (U18.B2-);
B-.5 = (U18.B1-);
B-.13 = (U9.B1-);
B-.4 = (U18.B0-);
B-.0 = (U0.B0-);
A-.3 = (U0.A3-);
A-.2 = (U0.A2-);
A-.1 = (U0.A1-);
A-.0 = (U0.A0-);
A-.12 = (U9.A0-);


/* type converters ********************/
```

```
ANNOTATIONS
{
  BUS BUS_TYPE = "DOT";
}

END MODULE;


/* * * * * * *  Contents of NET file ADD15F_SEL3.NET  * * * * * * */

/*******************************************************/
/*  Netlist copyright (C) 1989 LSI Logic Corporation  */
/*******************************************************/


MODULE ADD15F_SEL3;

INPUTS      A0,A1,A2,B0,B1,B2,CI;
OUTPUTS     G,P,SUM0,SUM1,SUM2;

LEVEL FUNCTION;
DEFINE
  /* implicit connectors ******************/

    A0- = (A0);
    G- = (G);
    A2- = (A2);
    B2- = (B2);
    P- = (P);
    B1- = (B1);
    A1- = (A1);
    SUM1- = (SUM1);
    SUM0- = (SUM0);
    CI- = (CI);
    SUM2- = (SUM2);
    B0- = (B0);


  /* part instances ************************/

    U2(U2.Z-=Z) = ND2C(B0-=B,A0-=A);
    U36(U36.Z-=Z) = N1B(U17.Z-=A);
    U8(U8.Z-=Z) = ND2C(B2-=B,A2-=A);
    U9(U9.Z-=Z) = NR2C(A2-=A,B2-=B);
    U3(U3.Z-=Z) = N1B(U9.Z-=A);
    U22(U22.Z-=Z) = N1C(U9.Z-=A);
    U13(U13.Z-=Z) = AO7B(U2.Z-=A,U6.Z-=B,U1.Z-=C);
    U1(U1.Z-=Z) = ND2C(B1-=B,A1-=A);
    U6(U6.Z-=Z) = NR2C(A1-=A,B1-=B);
    U15(U15.Z-=Z) = N1B(U6.Z-=A);
    U7(U7.Z-=Z) = NR2C(U6.Z-=A,U4.Z-=B);
    U5(U5.Z-=Z) = N1C(U7.Z-=A);
    U33(P-=Z) = AND2B(U22.Z-=B,U7.Z-=A);
    U26(U26.Z-=Z) = ND2B(U13.Z-=B,U22.Z-=A);
    U32(G-=Z) = ND2C(U26.Z-=A,U8.Z-=B);
    U17(U17.Z-=Z) = ND2B(U3.Z-=B,U8.Z-=A);
    U35(U35.Z-=Z) = MX21LA(U13.Z-=S,U36.Z-=A,U17.Z-=B);
    U28(U28.Z-=Z) = EOB(U27.Z-=A,U16.Z-=B);
    U30(SUM1-=Z) = MX21LB(U29.Z-=B,U28.Z-=A,U20.Z-=S);
    U21(U21.Z-=Z) = N1C(U25.Z-=A);
    U31(SUM0-=Z) = MX21LB(U21.Z-=A,U20.Z-=S,U25.Z-=B);
    U20(U20.Z-=Z) = N1D(CI-=A);
    U18(SUM2-=Z) = MX21LB(U35.Z-=B,U19.Z-=A,U20.Z-=S);
    U19(U19.Z-=Z) = MX21LA(U36.Z-=A,U17.Z-=B,U14.Z-=S);
    U14(U14.Z-=Z) = ND2C(U5.Z-=B,U1.Z-=A);
    U27(U27.Z-=Z) = ND2B(U15.Z-=B,U1.Z-=A);
    U29(U29.Z-=Z) = ENB(U2.Z-=A,U27.Z-=B);
    U25(U25.Z-=Z) = ND2B(U16.Z-=B,U2.Z-=A);
    U16(U16.Z-=Z) = N1B(U4.Z-=A);
    U4(U4.Z-=Z) = NR2C(A0-=A,B0-=B);


  /* extractors ****************************/
```

```
  /* type converters ********************/

ANNOTATIONS
{
  BUS BUS_TYPE = "DOT";
}

END MODULE;


/* * * * * * *  Contents of NET file ADD15F0_SEL4.NET  * * * * * * */

/*****************************************************/
/*  Netlist copyright (C) 1989 LSI Logic Corporation  */
/*****************************************************/


MODULE ADD15F0_SEL4;

INPUTS      A0,A1,A2,A3,B0,B1,B2,B3;
OUTPUTS     G,SUM0,SUM1,SUM2,SUM3;

LEVEL FUNCTION;
DEFINE
  /* implicit connectors *******************/

    G- = (G);
    SUM2- = (SUM2);
    SUM1- = (SUM1);
    B1- = (B1);
    A1- = (A1);
    A0- = (A0);
    B0- = (B0);
    SUM0- = (SUM0);
    SUM3- = (SUM3);
    B2- = (B2);
    A2- = (A2);
    B3- = (B3);
    A3- = (A3);


  /* part instances *************************/

    U30(SUM2-=Z) = N1C(U26.Z-=A);
    U29(SUM1-=Z) = N1C(U8.Z-=A);
    U14(U14.Z-=Z) = ND2C(B1-=B,A1-=A);
    U9(U9.Z-=Z) = NR2C(A1-=A,B1-=B);
    U4(U4.Z-=Z) = N1B(U9.Z-=A);
    U7(U7.Z-=Z) = ND2B(U14.Z-=A,U4.Z-=B);
    U8(U8.Z-=Z) = ENB(U7.Z-=B,U15.Z-=A);
    U28(SUM0-=Z) = N1C(U6.Z-=A);
    U6(U6.Z-=Z) = ND2B(U15.Z-=A,U5.Z-=B);
    U5(U5.Z-=Z) = N1B(U10.Z-=A);
    U10(U10.Z-=Z) = NR2C(A0-=A,B0-=B);
    U15(U15.Z-=Z) = ND2C(B0-=B,A0-=A);
    U17(U17.Z-=Z) = AO7B(U14.Z-=C,U9.Z-=B,U15.Z-=A);
    U31(SUM3-=Z) = N1C(U25.Z-=A);
    U23(U23.Z-=Z) = EOB(U22.Z-=B,U11.Z-=A);
    U25(U25.Z-=Z) = MX21LA(U23.Z-=A,U24.Z-=B,U17.Z-=S);
    U26(U26.Z-=Z) = MX21LA(U20.Z-=B,U21.Z-=A,U17.Z-=S);
    U21(U21.Z-=Z) = N1B(U20.Z-=A);
    U20(U20.Z-=Z) = ND2B(U11.Z-=A,U12.Z-=B);
    U13(U13.Z-=Z) = NR2C(A2-=A,B2-=B);
    U11(U11.Z-=Z) = ND2C(B2-=B,A2-=A);
    U2(U2.Z-=Z) = AO7A(U16.Z-=C,U11.Z-=A,U19.Z-=B);
    U0(U0.Z-=Z) = N1C(U2.Z-=A);
    U27(G-=Z) = ND2C(U3.Z-=A,U0.Z-=B);
    U3(U3.Z-=Z) = ND2B(U1.Z-=A,U17.Z-=B);
    U1(U1.Z-=Z) = NR2C(U19.Z-=B,U13.Z-=A);
    U12(U12.Z-=Z) = N1B(U13.Z-=A);
    U24(U24.Z-=Z) = ENB(U12.Z-=B,U22.Z-=A);
    U22(U22.Z-=Z) = ND2C(U18.Z-=B,U16.Z-=A);
    U18(U18.Z-=Z) = N1B(U19.Z-=A);
    U19(U19.Z-=Z) = NR2C(A3-=A,B3-=B);
    U16(U16.Z-=Z) = ND2C(B3-=B,A3-=A);
```

```
/* extractors ******************************/


/* type converters *********************/

ANNOTATIONS
{
  BUS BUS_TYPE = "DOT";
}

END MODULE;



/* * * * * * *  Contents of NET file ADD_SEL4.NET  * * * * * * */

/****************************************************/
/*  Netlist copyright (C) 1989 LSI Logic Corporation  */
/****************************************************/
MODULE ADD_SEL4;

INPUTS      A0,A1,A2,A3,B0,B1,B2,B3,CI;
OUTPUTS     G,P,SUM0,SUM1,SUM2,SUM3;

LEVEL FUNCTION;
DEFINE
  /* implicit connectors *******************/

    A1- = (A1);
    SUM1- = (SUM1);
    G- = (G);
    A3- = (A3);
    B3- = (B3);
    P- = (P);
    A2- = (A2);
    SUM3- = (SUM3);
    SUM2- = (SUM2);
    B2- = (B2);
    A0- = (A0);
    B0- = (B0);
    CI- = (CI);
    SUM0- = (SUM0);
    B1- = (B1);


  /* part instances **************************/

    U10(U10.Z-=Z) = NR2C(B3-=B,A3-=A);
    U15(U15.Z-=Z) = ND2C(B3-=B,A3-=A);
    U39(P-=Z) = AND2B(U18.Z-=B,U2.Z-=A);
    U18(U18.Z-=Z) = NR2C(U9.Z-=A,U10.Z-=B);
    U40(SUM3-=Z) = MX21LB(U25.Z-=S,U38.Z-=B,U36.Z-=A);
    U35(U35.Z-=Z) = EOB(U11.Z-=B,U7.Z-=A);
    U38(U38.Z-=Z) = MX21LA(U35.Z-=A,U37.Z-=B,U16.Z-=S);
    U36(U36.Z-=Z) = MX21LA(U3.Z-=S,U35.Z-=A,U37.Z-=B);
    U34(U34.Z-=Z) = MX21LA(U8.Z-=B,U33.Z-=A,U16.Z-=S);
    U32(SUM2-=Z) = MX21LB(U25.Z-=S,U31.Z-=A,U34.Z-=B);
    U31(U31.Z-=Z) = MX21LA(U3.Z-=S,U8.Z-=B,U33.Z-=A);
    U33(U33.Z-=Z) = N1B(U8.Z-=A);
    U8(U8.Z-=Z) = ND2B(U7.Z-=A,U12.Z-=B);
    U7(U7.Z-=Z) = ND2C(B2-=B,A2-=A);
    U9(U9.Z-=Z) = NR2C(B2-=B,A2-=A);
    U12(U12.Z-=Z) = N1B(U9.Z-=A);
    U37(U37.Z-=Z) = ENB(U12.Z-=B,U11.Z-=A);
    U11(U11.Z-=Z) = ND2C(U17.Z-=B,U15.Z-=A);
    U17(U17.Z-=Z) = N1B(U10.Z-=A);
    U20(U20.Z-=Z) = AO7A(U15.Z-=C,U7.Z-=A,U10.Z-=B);
    U23(U23.Z-=Z) = N1C(U20.Z-=A);
    U28(G-=Z) = ND2C(U22.Z-=A,U23.Z-=B);
    U22(U22.Z-=Z) = ND2B(U18.Z-=A,U16.Z-=B);
    U16(U16.Z-=Z) = AO7B(U14.Z-=C,U0.Z-=B,U13.Z-=A);
    U3(U3.Z-=Z) = ND2C(U6.Z-=B,U14.Z-=A);
    U6(U6.Z-=Z) = N1C(U2.Z-=A);
```

```
U2(U2.Z-=Z) = NR2C(U1.Z-=B,U0.Z-=A);
U13(U13.Z-=Z) = ND2C(B0-=B,A0-=A);
U1(U1.Z-=Z) = NR2C(B0-=B,A0-=A);
U4(U4.Z-=Z) = N1B(U1.Z-=A);
U26(U26.Z-=Z) = EOB(U4.Z-=B,U21.Z-=A);
U30(SUM1-=Z) = MX21LB(U25.Z-=S,U26.Z-=A,U27.Z-=B);
U25(U25.Z-=Z) = N1D(CI-=A);
U29(SUM0-=Z) = MX21LB(U19.Z-=B,U25.Z-=S,U24.Z-=A);
U24(U24.Z-=Z) = N1C(U19.Z-=A);
U19(U19.Z-=Z) = ND2B(U13.Z-=A,U4.Z-=B);
U27(U27.Z-=Z) = ENB(U21.Z-=B,U13.Z-=A);
U21(U21.Z-=Z) = ND2B(U14.Z-=A,U5.Z-=B);
U5(U5.Z-=Z) = N1B(U0.Z-=A);
U0(U0.Z-=Z) = NR2C(B1-=B,A1-=A);
U14(U14.Z-=Z) = ND2C(B1-=B,A1-=A);

/* extractors ******************************/


/* type converters *********************/

ANNOTATIONS
{
BUS BUS_TYPE = "DOT";
}

END MODULE;


/* * * * * * * Contents of NET file ADD14F.NET * * * * * * */

/******************************************************/
/* Netlist copyright (C) 1989 LSI Logic Corporation */
/******************************************************/


MODULE ADD14F;

INPUTS    A.13,A.12,A.11,A.10,A.9,A.8,A.7,A.6,A.5,A.4,A.3,A.2,
          A.1,A.0,B.13,B.12,B.11,B.10,B.9,B.8,B.7,B.6,B.5,B.4,
          B.3,B.2,B.1,B.0;
OUTPUTS   S.14,S.13,S.12,S.11,S.10,S.9,S.8,S.7,S.6,S.5,S.4,S.3,
          S.2,S.1,S.0;

LEVEL FUNCTION;
DEFINE
/* implicit connectors *******************/

S-.14 = (S.14);
S-.13 = (S.13);
S-.12 = (S.12);
S-.11 = (S.11);
S-.10 = (S.10);
S-.9 = (S.9);
S-.8 = (S.8);
S-.7 = (S.7);
S-.6 = (S.6);
S-.5 = (S.5);
S-.4 = (S.4);
S-.3 = (S.3);
S-.2 = (S.2);
S-.1 = (S.1);
S-.0 = (S.0);
B-.13 = (B.13);
B-.12 = (B.12);
B-.11 = (B.11);
B-.10 = (B.10);
B-.9 = (B.9);
B-.8 = (B.8);
B-.7 = (B.7);
```

```
 B-.6 = (B.6);
 B-.5 = (B.5);
 B-.4 = (B.4);
 B-.3 = (B.3);
 B-.2 = (B.2);
 B-.1 = (B.1);
 B-.0 = (B.0);
 A-.13 = (A.13);
 A-.12 = (A.12);
 A-.11 = (A.11);
 A-.10 = (A.10);
 A-.9 = (A.9);
 A-.8 = (A.8);
 A-.7 = (A.7);
 A-.6 = (A.6);
 A-.5 = (A.5);
 A-.4 = (A.4);
 A-.3 = (A.3);
 A-.2 = (A.2);
 A-.1 = (A.1);
 A-.0 = (A.0);


/* part instances **************************/

 U3(U3.Z-=Z) = N1C(U2.G-=A);
 U11(U11.Z-=Z) = N1C(U10.G-=A);
 U14(U14.Z-=Z) = ND2C(U9.Z-=A,U11.Z-=B);
 U15(U15.Z-=Z) = N1B(U14.Z-=A);
 U16(U16.Z-=Z) = ND2C(U15.Z-=B,U12.Z-=A);
 U12(U12.Z-=Z) = ND2B(U4.Z-=A,U13.Z-=B);
 U6(U6.Z-=Z) = ND2B(U4.Z-=A,U0.P-=B);
 U13(U13.Z-=Z) = AND2B(U10.P-=B,U0.P-=A);
 U9(U9.Z-=Z) = ND2C(U10.P-=B,U0.G-=A);
 U7(U7.Z-=Z) = N1A(U0.G-=A);
 U5(U5.Z-=Z) = ND2B(U6.Z-=A,U7.Z-=B);
 U10(U10.P-=P,U10.G-=G,U10.SUM0-=SUM0,U10.SUM1-=SUM1) = ADD_SEL2(
        U10.B0-=B0,U10.B1-=B1,U10.A1-=A1,U10.A0-=A0,U5.Z-=CI);
 U8(U8.SUM0-=SUM0,U8.SUM1-=SUM1,U8.SUM2-=SUM2,U8.SUM3-=SUM3,
        U8.G-=G) = ADD15F0_SEL4(U8.B3-=B3,U8.B2-=B2,U8.B1-=B1,
        U8.B0-=B0,U8.A3-=A3,U8.A2-=A2,U8.A1-=A1,U8.A0-=A0);
 U0(U0.P-=P,U0.G-=G,U0.SUM0-=SUM0,U0.SUM3-=SUM3,U0.SUM2-=SUM2,
        U0.SUM1-=SUM1) = ADD_SEL4(U0.A3-=A3,U0.A2-=A2,U0.A1-=A1,
        U0.A0-=A0,U0.B0-=B0,U0.B2-=B2,U0.B1-=B1,U0.B3-=B3,
        U4.Z-=CI);
 U4(U4.Z-=Z) = ND2C(U1.Z-=A,U3.Z-=B);
 U1(U1.Z-=Z) = ND2C(U8.G-=A,U2.P-=B);
 U2(U2.SUM3-=SUM3,U2.P-=P,U2.G-=G,U2.SUM0-=SUM0,U2.SUM2-=SUM2,
        U2.SUM1-=SUM1) = ADD_SEL4(U2.A3-=A3,U2.A2-=A2,U2.A1-=A1,
        U2.A0-=A0,U2.B0-=B0,U2.B3-=B3,U2.B2-=B2,U2.B1-=B1,
        U8.G-=CI);


/* extractors ****************************/

 A-.7 = (U2.A3-);
 A-.5 = (U2.A1-);
 A-.4 = (U2.A0-);
 A-.11 = (U0.A3-);
 A-.10 = (U0.A2-);
 A-.9 = (U0.A1-);
 A-.8 = (U0.A0-);
 M-0.7 = (U2.SUM3-);
 M-0.8 = (U0.SUM0-);
 M-0.5 = (U2.SUM1-);
 M-0.11 = (U0.SUM3-);
 M-0.4 = (U2.SUM0-);
 M-0.0 = (U8.SUM0-);
 M-0.1 = (U8.SUM1-);
 M-0.3 = (U8.SUM3-);
 B-.10 = (U0.B2-);
 B-.5 = (U2.B1-);
 B-.8 = (U0.B0-);
 B-.4 = (U2.B0-);
```

```
B-.6 = (U2.B2-);
B-.1 = (U8.B1-);
B-.12 = (U10.B0-);
A-.13 = (U10.A1-);
A-.12 = (U10.A0-);
M-0.12 = (U10.SUM0-);
M-0.13 = (U10.SUM1-);
S-.13 = (M-0.13);
S-.12 = (M-0.12);
S-.11 = (M-0.11);
S-.10 = (M-0.10);
S-.9 = (M-0.9);
S-.8 = (M-0.8);
S-.7 = (M-0.7);
S-.6 = (M-0.6);
S-.5 = (M-0.5);
S-.4 = (M-0.4);
S-.3 = (M-0.3);
S-.2 = (M-0.2);
S-.1 = (M-0.1);
S-.0 = (M-0.0);
S-.14 = (U16.Z-);
B-.13 = (U10.B1-);
B-.2 = (U8.B2-);
B-.7 = (U2.B3-);
B-.3 = (U8.B3-);
B-.9 = (U0.B1-);
B-.11 = (U0.B3-);
B-.0 = (U8.B0-);
A-.3 = (U8.A3-);
A-.2 = (U8.A2-);
A-.1 = (U8.A1-);
A-.0 = (U8.A0-);
M-0.2 = (U8.SUM2-);
M-0.10 = (U0.SUM2-);
M-0.6 = (U2.SUM2-);
M-0.9 = (U0.SUM1-);
A-.6 = (U2.A2-);

/* type converters *********************/

ANNOTATIONS
{
 BUS BUS_TYPE = "DOT";
}

END MODULE;


/* * * * * * *  Contents of NET file ADD_SEL2.NET  * * * * * * */

/******************************************************/
/*  Netlist copyright (C) 1989 LSI Logic Corporation  */
/******************************************************/


MODULE ADD_SEL2;

INPUTS      A0,A1,B0,B1,CI;
OUTPUTS     G,P,SUM0,SUM1;

LEVEL FUNCTION;
DEFINE
 /* implicit connectors *******************/

   B1- = (B1);
   G- = (G);
   SUM1- = (SUM1);
   P- = (P);
   CI- = (CI);
   SUM0- = (SUM0);
   B0- = (B0);
```

```
    A0- = (A0);
    A1- = (A1);


  /* part instances ****************************/

    U12(U12.Z-=Z) = N1D(CI-=A);
    U9(U9.Z-=Z) = N1C(U7.Z-=A);
    U11(SUM0-=Z) = MX21LB(U7.Z-=B,U12.Z-=S,U9.Z-=A);
    U7(U7.Z-=Z) = ND2B(U5.Z-=B,U21.Z-=A);
    U5(U5.Z-=Z) = N1B(U1.Z-=A);
    U21(U21.Z-=Z) = ND2C(B0-=B,A0-=A);
    U1(U1.Z-=Z) = NR2C(B0-=B,A0-=A);
    U2(P-=Z) = NR2C(U1.Z-=B,U0.Z-=A);
    U6(U6.Z-=Z) = N1B(U0.Z-=A);
    U13(U13.Z-=Z) = ND2B(U6.Z-=B,U19.Z-=A);
    U14(U14.Z-=Z) = EOB(U5.Z-=B,U13.Z-=A);
    U15(SUM1-=Z) = MX21LB(U12.Z-=S,U14.Z-=A,U25.Z-=B);
    U25(U25.Z-=Z) = ENB(U13.Z-=B,U21.Z-=A);
    U22(G-=Z) = AO7B(U19.Z-=C,U0.Z-=B,U21.Z-=A);
    U19(U19.Z-=Z) = ND2C(B1-=B,A1-=A);
    U0(U0.Z-=Z) = NR2C(B1-=B,A1-=A);


  /* extractors ********************************/



  /* type converters **********************/

ANNOTATIONS
{
  BUS BUS_TYPE = "DOT";
}

END MODULE;



/* * * * * * *  Contents of NET file DATA_MUXV2.NET  * * * * * * */

/*******************************************************/
/*  Netlist copyright (C) 1989 LSI Logic Corporation  */
/*******************************************************/

MODULE DATA_MUXV2;

INPUTS       CP,RC0.7,RC0.6,RC0.5,RC0.4,RC0.3,RC0.2,RC0.1,RC0.0,
             RC1.7,RC1.6,RC1.5,RC1.4,RC1.3,RC1.2,RC1.1,RC1.0,RC2.7,
             RC2.6,RC2.5,RC2.4,RC2.3,RC2.2,RC2.1,RC2.0,RC3.7,RC3.6,
             RC3.5,RC3.4,RC3.3,RC3.2,RC3.1,RC3.0,RC4.7,RC4.6,RC4.5,
             RC4.4,RC4.3,RC4.2,RC4.1,RC4.0,RESET_,S0.2,S0.1,S0.0,
             S1.2,S1.1,S1.0,S2.2,S2.1,S2.0,S3.2,S3.1,S3.0,S4.2,
             S4.1,S4.0,STB_I,WAIT;
OUTPUTS      D0.7,D0.6,D0.5,D0.4,D0.3,D0.2,D0.1,D0.0,D1.7,D1.6,
             D1.5,D1.4,D1.3,D1.2,D1.1,D1.0,D2.7,D2.6,D2.5,D2.4,
             D2.3,D2.2,D2.1,D2.0,D3.7,D3.6,D3.5,D3.4,D3.3,D3.2,
             D3.1,D3.0,D4.7,D4.6,D4.5,D4.4,D4.3,D4.2,D4.1,D4.0;

LEVEL FUNCTION;
DEFINE
  /* implicit connectors *******************/

    RESET_- = (RESET_);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC3-.7 = (RC3.7);
    RC3-.6 = (RC3.6);
```

```
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
S2-.2 = (S2.2);
S2-.1 = (S2.1);
S2-.0 = (S2.0);
D2-.7 = (D2.7);
D2-.6 = (D2.6);
D2-.5 = (D2.5);
D2-.4 = (D2.4);
D2-.3 = (D2.3);
D2-.2 = (D2.2);
D2-.1 = (D2.1);
D2-.0 = (D2.0);
S1-.2 = (S1.2);
S1-.1 = (S1.1);
S1-.0 = (S1.0);
D1-.7 = (D1.7);
D1-.6 = (D1.6);
D1-.5 = (D1.5);
D1-.4 = (D1.4);
D1-.3 = (D1.3);
D1-.2 = (D1.2);
D1-.1 = (D1.1);
D1-.0 = (D1.0);
S3-.2 = (S3.2);
S3-.1 = (S3.1);
S3-.0 = (S3.0);
D3-.7 = (D3.7);
D3-.6 = (D3.6);
D3-.5 = (D3.5);
D3-.4 = (D3.4);
D3-.3 = (D3.3);
D3-.2 = (D3.2);
D3-.1 = (D3.1);
D3-.0 = (D3.0);
S4-.2 = (S4.2);
S4-.1 = (S4.1);
S4-.0 = (S4.0);
D4-.7 = (D4.7);
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
U9.D7- = (NC/0/);
S0-.2 = (S0.2);
S0-.1 = (S0.1);
S0-.0 = (S0.0);
D0-.7 = (D0.7);
D0-.6 = (D0.6);
D0-.5 = (D0.5);
D0-.4 = (D0.4);
D0-.3 = (D0.3);
D0-.2 = (D0.2);
D0-.1 = (D0.1);
D0-.0 = (D0.0);
RC1-.7 = (RC1.7);
RC1-.6 = (RC1.6);
RC1-.5 = (RC1.5);
RC1-.4 = (RC1.4);
```

```
RC1-.3 = (RC1.3);
RC1-.2 = (RC1.2);
RC1-.1 = (RC1.1);
RC1-.0 = (RC1.0);
CP- = (CP);
WAIT- = (WAIT);
STB_I- = (STB_I);
BWAIT- = (BWAIT);
BWAIT- = (BWAIT);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);


/* part instances ***************************/

U2(U2.Z-=Z) = N1A(RESET_-=A);
U1(U1.Z-=Z) = N1B(U2.Z-=A);
U4.7(U4.Q-.7=Q) = FD2SA(U4.Q-.7=TI,RC4-.7=D,CP-=CP,BWAIT-=TE,
      U1.Z-=CD);
U4.6(U4.Q-.6=Q) = FD2SA(U4.Q-.6=TI,RC4-.6=D,CP-=CP,BWAIT-=TE,
      U1.Z-=CD);
U4.5(U4.Q-.5=Q) = FD2SA(U4.Q-.5=TI,RC4-.5=D,CP-=CP,BWAIT-=TE,
      U1.Z-=CD);
U4.4(U4.Q-.4=Q) = FD2SA(U4.Q-.4=TI,RC4-.4=D,CP-=CP,BWAIT-=TE,
      U1.Z-=CD);
U4.3(U4.Q-.3=Q) = FD2SA(U4.Q-.3=TI,RC4-.3=D,CP-=CP,BWAIT-=TE,
      U1.Z-=CD);
U4.2(U4.Q-.2=Q) = FD2SA(U4.Q-.2=TI,RC4-.2=D,CP-=CP,BWAIT-=TE,
      U1.Z-=CD);
U4.1(U4.Q-.1=Q) = FD2SA(U4.Q-.1=TI,RC4-.1=D,CP-=CP,BWAIT-=TE,
      U1.Z-=CD);
U4.0(U4.Q-.0=Q) = FD2SA(U4.Q-.0=TI,RC4-.0=D,CP-=CP,BWAIT-=TE,
      U1.Z-=CD);
U9.7(D2-.7=Z) = MUX81HB(U13.Q-.7=D0,U12.Q-.7=D1,U8.Q-.7=D2,
      U7.Q-.7=D3,U4.Q-.7=D4,U9.B-=B,U9.A-=A,U9.D7-=D5,
      U9.D7-=D6,U9.D7-=D7,U9.C-=C);
U9.6(D2-.6=Z) = MUX81HB(U13.Q-.6=D0,U12.Q-.6=D1,U8.Q-.6=D2,
      U7.Q-.6=D3,U4.Q-.6=D4,U9.B-=B,U9.A-=A,U9.D7-=D5,
      U9.D7-=D6,U9.D7-=D7,U9.C-=C);
U9.5(D2-.5=Z) = MUX81HB(U13.Q-.5=D0,U12.Q-.5=D1,U8.Q-.5=D2,
      U7.Q-.5=D3,U4.Q-.5=D4,U9.B-=B,U9.A-=A,U9.D7-=D5,
      U9.D7-=D6,U9.D7-=D7,U9.C-=C);
U9.4(D2-.4=Z) = MUX81HB(U13.Q-.4=D0,U12.Q-.4=D1,U8.Q-.4=D2,
      U7.Q-.4=D3,U4.Q-.4=D4,U9.B-=B,U9.A-=A,U9.D7-=D5,
      U9.D7-=D6,U9.D7-=D7,U9.C-=C);
U9.3(D2-.3=Z) = MUX81HB(U13.Q-.3=D0,U12.Q-.3=D1,U8.Q-.3=D2,
      U7.Q-.3=D3,U4.Q-.3=D4,U9.B-=B,U9.A-=A,U9.D7-=D5,
      U9.D7-=D6,U9.D7-=D7,U9.C-=C);
U9.2(D2-.2=Z) = MUX81HB(U13.Q-.2=D0,U12.Q-.2=D1,U8.Q-.2=D2,
      U7.Q-.2=D3,U4.Q-.2=D4,U9.B-=B,U9.A-=A,U9.D7-=D5,
      U9.D7-=D6,U9.D7-=D7,U9.C-=C);
U9.1(D2-.1=Z) = MUX81HB(U13.Q-.1=D0,U12.Q-.1=D1,U8.Q-.1=D2,
      U7.Q-.1=D3,U4.Q-.1=D4,U9.B-=B,U9.A-=A,U9.D7-=D5,
      U9.D7-=D6,U9.D7-=D7,U9.C-=C);
U9.0(D2-.0=Z) = MUX81HB(U13.Q-.0=D0,U12.Q-.0=D1,U8.Q-.0=D2,
      U7.Q-.0=D3,U4.Q-.0=D4,U9.B-=B,U9.A-=A,U9.D7-=D5,
      U9.D7-=D6,U9.D7-=D7,U9.C-=C);
U10.7(D1-.7=Z) = MUX81HB(U13.Q-.7=D0,U12.Q-.7=D1,U8.Q-.7=D2,
      U7.Q-.7=D3,U4.Q-.7=D4,U9.D7-=D5,U9.D7-=D6,U9.D7-=D7,
      U10.C-=C,U10.B-=B,U10.A-=A);
U10.6(D1-.6=Z) = MUX81HB(U13.Q-.6=D0,U12.Q-.6=D1,U8.Q-.6=D2,
      U7.Q-.6=D3,U4.Q-.6=D4,U9.D7-=D5,U9.D7-=D6,U9.D7-=D7,
      U10.C-=C,U10.B-=B,U10.A-=A);
U10.5(D1-.5=Z) = MUX81HB(U13.Q-.5=D0,U12.Q-.5=D1,U8.Q-.5=D2,
      U7.Q-.5=D3,U4.Q-.5=D4,U9.D7-=D5,U9.D7-=D6,U9.D7-=D7,
      U10.C-=C,U10.B-=B,U10.A-=A);
U10.4(D1-.4=Z) = MUX81HB(U13.Q-.4=D0,U12.Q-.4=D1,U8.Q-.4=D2,
      U7.Q-.4=D3,U4.Q-.4=D4,U9.D7-=D5,U9.D7-=D6,U9.D7-=D7,
      U10.C-=C,U10.B-=B,U10.A-=A);
```

```
U10.3(D1-.3=Z) = MUX81HB(U13.Q-.3=D0,U12.Q-.3=D1,U8.Q-.3=D2,
        U7.Q-.3=D3,U4.Q-.3=D4,U9.D7-=D5,U9.D7-=D6,U9.D7-=D7,
        U10.C-=C,U10.B-=B,U10.A-=A);
U10.2(D1-.2=Z) = MUX81HB(U13.Q-.2=D0,U12.Q-.2=D1,U8.Q-.2=D2,
        U7.Q-.2=D3,U4.Q-.2=D4,U9.D7-=D5,U9.D7-=D6,U9.D7-=D7,
        U10.C-=C,U10.B-=B,U10.A-=A);
U10.1(D1-.1=Z) = MUX81HB(U13.Q-.1=D0,U12.Q-.1=D1,U8.Q-.1=D2,
        U7.Q-.1=D3,U4.Q-.1=D4,U9.D7-=D5,U9.D7-=D6,U9.D7-=D7,
        U10.C-=C,U10.B-=B,U10.A-=A);
U10.0(D1-.0=Z) = MUX81HB(U13.Q-.0=D0,U12.Q-.0=D1,U8.Q-.0=D2,
        U7.Q-.0=D3,U4.Q-.0=D4,U9.D7-=D5,U9.D7-=D6,U9.D7-=D7,
        U10.C-=C,U10.B-=B,U10.A-=A);
U6.7(D3-.7=Z) = MUX81HB(U13.Q-.7=D0,U12.Q-.7=D1,U8.Q-.7=D2,
        U7.Q-.7=D3,U4.Q-.7=D4,U6.C-=C,U6.B-=B,U6.A-=A,U9.D7-=D5,
        U9.D7-=D6,U9.D7-=D7);
U6.6(D3-.6=Z) = MUX81HB(U13.Q-.6=D0,U12.Q-.6=D1,U8.Q-.6=D2,
        U7.Q-.6=D3,U4.Q-.6=D4,U6.C-=C,U6.B-=B,U6.A-=A,U9.D7-=D5,
        U9.D7-=D6,U9.D7-=D7);
U6.5(D3-.5=Z) = MUX81HB(U13.Q-.5=D0,U12.Q-.5=D1,U8.Q-.5=D2,
        U7.Q-.5=D3,U4.Q-.5=D4,U6.C-=C,U6.B-=B,U6.A-=A,U9.D7-=D5,
        U9.D7-=D6,U9.D7-=D7);
U6.4(D3-.4=Z) = MUX81HB(U13.Q-.4=D0,U12.Q-.4=D1,U8.Q-.4=D2,
        U7.Q-.4=D3,U4.Q-.4=D4,U6.C-=C,U6.B-=B,U6.A-=A,U9.D7-=D5,
        U9.D7-=D6,U9.D7-=D7);
U6.3(D3-.3=Z) = MUX81HB(U13.Q-.3=D0,U12.Q-.3=D1,U8.Q-.3=D2,
        U7.Q-.3=D3,U4.Q-.3=D4,U6.C-=C,U6.B-=B,U6.A-=A,U9.D7-=D5,
        U9.D7-=D6,U9.D7-=D7);
U6.2(D3-.2=Z) = MUX81HB(U13.Q-.2=D0,U12.Q-.2=D1,U8.Q-.2=D2,
        U7.Q-.2=D3,U4.Q-.2=D4,U6.C-=C,U6.B-=B,U6.A-=A,U9.D7-=D5,
        U9.D7-=D6,U9.D7-=D7);
U6.1(D3-.1=Z) = MUX81HB(U13.Q-.1=D0,U12.Q-.1=D1,U8.Q-.1=D2,
        U7.Q-.1=D3,U4.Q-.1=D4,U6.C-=C,U6.B-=B,U6.A-=A,U9.D7-=D5,
        U9.D7-=D6,U9.D7-=D7);
U6.0(D3-.0=Z) = MUX81HB(U13.Q-.0=D0,U12.Q-.0=D1,U8.Q-.0=D2,
        U7.Q-.0=D3,U4.Q-.0=D4,U6.C-=C,U6.B-=B,U6.A-=A,U9.D7-=D5,
        U9.D7-=D6,U9.D7-=D7);
U5.7(D4-.7=Z) = MUX81HB(U12.Q-.7=D1,U13.Q-.7=D0,U8.Q-.7=D2,
        U7.Q-.7=D3,U4.Q-.7=D4,U9.D7-=D6,U9.D7-=D7,U9.D7-=D5,
        U5.C-=C,U5.B-=B,U5.A-=A);
U5.6(D4-.6=Z) = MUX81HB(U12.Q-.6=D1,U13.Q-.6=D0,U8.Q-.6=D2,
        U7.Q-.6=D3,U4.Q-.6=D4,U9.D7-=D6,U9.D7-=D7,U9.D7-=D5,
        U5.C-=C,U5.B-=B,U5.A-=A);
U5.5(D4-.5=Z) = MUX81HB(U12.Q-.5=D1,U13.Q-.5=D0,U8.Q-.5=D2,
        U7.Q-.5=D3,U4.Q-.5=D4,U9.D7-=D6,U9.D7-=D7,U9.D7-=D5,
        U5.C-=C,U5.B-=B,U5.A-=A);
U5.4(D4-.4=Z) = MUX81HB(U12.Q-.4=D1,U13.Q-.4=D0,U8.Q-.4=D2,
        U7.Q-.4=D3,U4.Q-.4=D4,U9.D7-=D6,U9.D7-=D7,U9.D7-=D5,
        U5.C-=C,U5.B-=B,U5.A-=A);
U5.3(D4-.3=Z) = MUX81HB(U12.Q-.3=D1,U13.Q-.3=D0,U8.Q-.3=D2,
        U7.Q-.3=D3,U4.Q-.3=D4,U9.D7-=D6,U9.D7-=D7,U9.D7-=D5,
        U5.C-=C,U5.B-=B,U5.A-=A);
U5.2(D4-.2=Z) = MUX81HB(U12.Q-.2=D1,U13.Q-.2=D0,U8.Q-.2=D2,
        U7.Q-.2=D3,U4.Q-.2=D4,U9.D7-=D6,U9.D7-=D7,U9.D7-=D5,
        U5.C-=C,U5.B-=B,U5.A-=A);
U5.1(D4-.1=Z) = MUX81HB(U12.Q-.1=D1,U13.Q-.1=D0,U8.Q-.1=D2,
        U7.Q-.1=D3,U4.Q-.1=D4,U9.D7-=D6,U9.D7-=D7,U9.D7-=D5,
        U5.C-=C,U5.B-=B,U5.A-=A);
U5.0(D4-.0=Z) = MUX81HB(U12.Q-.0=D1,U13.Q-.0=D0,U8.Q-.0=D2,
        U7.Q-.0=D3,U4.Q-.0=D4,U9.D7-=D6,U9.D7-=D7,U9.D7-=D5,
        U5.C-=C,U5.B-=B,U5.A-=A);
U11.7(D0-.7=Z) = MUX81HB(U13.Q-.7=D0,U12.Q-.7=D1,U8.Q-.7=D2,
        U7.Q-.7=D3,U4.Q-.7=D4,U9.D7-=D5,U9.D7-=D6,U9.D7-=D7,
        U11.C-=C,U11.B-=B,U11.A-=A);
U11.6(D0-.6=Z) = MUX81HB(U13.Q-.6=D0,U12.Q-.6=D1,U8.Q-.6=D2,
        U7.Q-.6=D3,U4.Q-.6=D4,U9.D7-=D5,U9.D7-=D6,U9.D7-=D7,
        U11.C-=C,U11.B-=B,U11.A-=A);
U11.5(D0-.5=Z) = MUX81HB(U13.Q-.5=D0,U12.Q-.5=D1,U8.Q-.5=D2,
        U7.Q-.5=D3,U4.Q-.5=D4,U9.D7-=D5,U9.D7-=D6,U9.D7-=D7,
        U11.C-=C,U11.B-=B,U11.A-=A);
U11.4(D0-.4=Z) = MUX81HB(U13.Q-.4=D0,U12.Q-.4=D1,U8.Q-.4=D2,
        U7.Q-.4=D3,U4.Q-.4=D4,U9.D7-=D5,U9.D7-=D6,U9.D7-=D7,
        U11.C-=C,U11.B-=B,U11.A-=A);
U11.3(D0-.3=Z) = MUX81HB(U13.Q-.3=D0,U12.Q-.3=D1,U8.Q-.3=D2,
        U7.Q-.3=D3,U4.Q-.3=D4,U9.D7-=D5,U9.D7-=D6,U9.D7-=D7,
        U11.C-=C,U11.B-=B,U11.A-=A);
U11.2(D0-.2=Z) = MUX81HB(U13.Q-.2=D0,U12.Q-.2=D1,U8.Q-.2=D2,
```

```
        U7.Q-.2=D3,U4.Q-.2=D4,U9.D7-=D5,U9.D7-=D6,U9.D7-=D7,
        U11.C-=C,U11.B-=B,U11.A-=A);
U11.1(D0-.1=Z) = MUX81HB(U13.Q-.1=D0,U12.Q-.1=D1,U8.Q-.1=D2,
        U7.Q-.1=D3,U4.Q-.1=D4,U9.D7-=D5,U9.D7-=D6,U9.D7-=D7,
        U11.C-=C,U11.B-=B,U11.A-=A);
U11.0(D0-.0=Z) = MUX81HB(U13.Q-.0=D0,U12.Q-.0=D1,U8.Q-.0=D2,
        U7.Q-.0=D3,U4.Q-.0=D4,U9.D7-=D5,U9.D7-=D6,U9.D7-=D7,
        U11.C-=C,U11.B-=B,U11.A-=A);
U12.7(U12.Q-.7=Q) = FD2SA(U12.Q-.7=TI,RC1-.7=D,CP-=CP,BWAIT-=TE,
        U1.Z-=CD);
U12.6(U12.Q-.6=Q) = FD2SA(U12.Q-.6=TI,RC1-.6=D,CP-=CP,BWAIT-=TE,
        U1.Z-=CD);
U12.5(U12.Q-.5=Q) = FD2SA(U12.Q-.5=TI,RC1-.5=D,CP-=CP,BWAIT-=TE,
        U1.Z-=CD);
U12.4(U12.Q-.4=Q) = FD2SA(U12.Q-.4=TI,RC1-.4=D,CP-=CP,BWAIT-=TE,
        U1.Z-=CD);
U12.3(U12.Q-.3=Q) = FD2SA(U12.Q-.3=TI,RC1-.3=D,CP-=CP,BWAIT-=TE,
        U1.Z-=CD);
U12.2(U12.Q-.2=Q) = FD2SA(U12.Q-.2=TI,RC1-.2=D,CP-=CP,BWAIT-=TE,
        U1.Z-=CD);
U12.1(U12.Q-.1=Q) = FD2SA(U12.Q-.1=TI,RC1-.1=D,CP-=CP,BWAIT-=TE,
        U1.Z-=CD);
U12.0(U12.Q-.0=Q) = FD2SA(U12.Q-.0=TI,RC1-.0=D,CP-=CP,BWAIT-=TE,
        U1.Z-=CD);
U7.7(U7.Q-.7=Q) = FD2SA(U7.Q-.7=TI,RC3-.7=D,CP-=CP,BWAIT-=TE,
        U1.Z-=CD);
U7.6(U7.Q-.6=Q) = FD2SA(U7.Q-.6=TI,RC3-.6=D,CP-=CP,BWAIT-=TE,
        U1.Z-=CD);
U7.5(U7.Q-.5=Q) = FD2SA(U7.Q-.5=TI,RC3-.5=D,CP-=CP,BWAIT-=TE,
        U1.Z-=CD);
U7.4(U7.Q-.4=Q) = FD2SA(U7.Q-.4=TI,RC3-.4=D,CP-=CP,BWAIT-=TE,
        U1.Z-=CD);
U7.3(U7.Q-.3=Q) = FD2SA(U7.Q-.3=TI,RC3-.3=D,CP-=CP,BWAIT-=TE,
        U1.Z-=CD);
U7.2(U7.Q-.2=Q) = FD2SA(U7.Q-.2=TI,RC3-.2=D,CP-=CP,BWAIT-=TE,
        U1.Z-=CD);
U7.1(U7.Q-.1=Q) = FD2SA(U7.Q-.1=TI,RC3-.1=D,CP-=CP,BWAIT-=TE,
        U1.Z-=CD);
U7.0(U7.Q-.0=Q) = FD2SA(U7.Q-.0=TI,RC3-.0=D,CP-=CP,BWAIT-=TE,
        U1.Z-=CD);
U3(U3.Z-=Z) = NR2B(WAIT-=A,STB_I-=B);
U0(BWAIT-=Z) = N1E(U3.Z-=A);
U8.7(U8.Q-.7=Q) = FD2SA(U8.Q-.7=TI,RC2-.7=D,CP-=CP,BWAIT-=TE,
        U1.Z-=CD);
U8.6(U8.Q-.6=Q) = FD2SA(U8.Q-.6=TI,RC2-.6=D,CP-=CP,BWAIT-=TE,
        U1.Z-=CD);
U8.5(U8.Q-.5=Q) = FD2SA(U8.Q-.5=TI,RC2-.5=D,CP-=CP,BWAIT-=TE,
        U1.Z-=CD);
U8.4(U8.Q-.4=Q) = FD2SA(U8.Q-.4=TI,RC2-.4=D,CP-=CP,BWAIT-=TE,
        U1.Z-=CD);
U8.3(U8.Q-.3=Q) = FD2SA(U8.Q-.3=TI,RC2-.3=D,CP-=CP,BWAIT-=TE,
        U1.Z-=CD);
U8.2(U8.Q-.2=Q) = FD2SA(U8.Q-.2=TI,RC2-.2=D,CP-=CP,BWAIT-=TE,
        U1.Z-=CD);
U8.1(U8.Q-.1=Q) = FD2SA(U8.Q-.1=TI,RC2-.1=D,CP-=CP,BWAIT-=TE,
        U1.Z-=CD);
U8.0(U8.Q-.0=Q) = FD2SA(U8.Q-.0=TI,RC2-.0=D,CP-=CP,BWAIT-=TE,
        U1.Z-=CD);
U13.7(U13.Q-.7=Q) = FD2SA(U13.Q-.7=TI,RC0-.7=D,CP-=CP,BWAIT-=TE,
        U1.Z-=CD);
U13.6(U13.Q-.6=Q) = FD2SA(U13.Q-.6=TI,RC0-.6=D,CP-=CP,BWAIT-=TE,
        U1.Z-=CD);
U13.5(U13.Q-.5=Q) = FD2SA(U13.Q-.5=TI,RC0-.5=D,CP-=CP,BWAIT-=TE,
        U1.Z-=CD);
U13.4(U13.Q-.4=Q) = FD2SA(U13.Q-.4=TI,RC0-.4=D,CP-=CP,BWAIT-=TE,
        U1.Z-=CD);
U13.3(U13.Q-.3=Q) = FD2SA(U13.Q-.3=TI,RC0-.3=D,CP-=CP,BWAIT-=TE,
        U1.Z-=CD);
U13.2(U13.Q-.2=Q) = FD2SA(U13.Q-.2=TI,RC0-.2=D,CP-=CP,BWAIT-=TE,
        U1.Z-=CD);
U13.1(U13.Q-.1=Q) = FD2SA(U13.Q-.1=TI,RC0-.1=D,CP-=CP,BWAIT-=TE,
        U1.Z-=CD);
U13.0(U13.Q-.0=Q) = FD2SA(U13.Q-.0=TI,RC0-.0=D,CP-=CP,BWAIT-=TE,
        U1.Z-=CD);
```

```
  /* extractors *****************************/

    S2-.0 = (U9.A-);
    S2-.1 = (U9.B-);
    S2-.2 = (U9.C-);
    S1-.2 = (U10.C-);
    S1-.1 = (U10.B-);
    S1-.0 = (U10.A-);
    S3-.2 = (U6.C-);
    S3-.1 = (U6.B-);
    S3-.0 = (U6.A-);
    S4-.1 = (U5.B-);
    S4-.2 = (U5.C-);
    S4-.0 = (U5.A-);
    S0-.2 = (U11.C-);
    S0-.1 = (U11.B-);
    S0-.0 = (U11.A-);

  /* type converters *********************/

ANNOTATIONS
{
  BUS BUS_TYPE = "DOT";
}

END MODULE;


/* * * * * * *  Contents of NET file INPMUX_DECV2.NET  * * * * * * */

/*****************************************************/
/*  Netlist copyright (C) 1989 LSI Logic Corporation  */
/*****************************************************/


MODULE INPMUX_DECV2;

INPUTS        FIRST_ROW,LAST_MINUS1,LAST_ROW,ROW_ORD0,ROW_ORD1,
              ROW_ORD2,SECOND_ROW;
OUTPUTS       S00,S01,S02,S10,S11,S12,S20,S21,S22,S30,S31,S32,S40,
              S41,S42;

LEVEL FUNCTION;
DEFINE
  /* implicit connectors *******************/

    S01- = (S01);
    S10- = (S10);
    S30- = (S30);
    S31- = (S31);

  LAST_MINUS1- = (LAST_MINUS1);
  SECOND_ROW- = (SECOND_ROW);
  LAST_ROW- = (LAST_ROW);
  S20- = (S20);
  S12- = (S12);
  ROW_ORD2- = (ROW_ORD2);
  ROW_ORD1- = (ROW_ORD1);
  ROW_ORD0- = (ROW_ORD0);
  FIRST_ROW- = (FIRST_ROW);
  S32- = (S32);
  S00- = (S00);
  S22- = (S22);
  S02- = (S02);
  S41- = (S41);
  S11- = (S11);
  S40- = (S40);
  S21- = (S21);
  S42- = (S42);


/* part instances **************************/
```

```
M121(M121.Z--Z) = ND2B(M73.Z--A,M93.Z--B);
M175(M175.Z--Z) = ND2B(M69.Z--A,M73.Z--B);
M113(M113.Z--Z) = AND3B(M21.Z--B,M17.Z--A,M25.Z--C);
M8(M8.Z--Z) = N1B(LAST_MINUS1--A);
M7(M7.Z--Z) = N1B(SECOND_ROW--A);
M24(M24.Z--Z) = AND3C(LAST_MINUS1--B,M7.Z--A,M9.Z--C);
M9(M9.Z--Z) = N1B(LAST_ROW--A);
M16(M16.Z--Z) = AND3C(SECOND_ROW--A,M8.Z--B,M9.Z--C);
M136(M136.Z--Z) = ND2B(M89.Z--A,M97.Z--B);
M161(M161.Z--Z) = ND2B(M97.Z--B,M85.Z--A);
M85(M85.Z--Z) = ND3C(M13.Z--A,M27.Z--B,M24.Z--C);
M141(M141.Z--Z) = AND2B(M61.Z--A,M73.Z--B);
M145(M145.Z--Z) = ND2B(M89.Z--B,M77.Z--A);
M77(M77.Z--Z) = ND3C(M13.Z--A,M27.Z--B,M179.Z--C);
M143(M143.Z--Z) = AND3B(M33.Z--C,M29.Z--B,M25.Z--A);
M110(M110.Z--Z) = AND2B(M33.Z--A,M61.Z--B);
M149(M149.Z--Z) = AND3B(M33.Z--B,M37.Z--C,M17.Z--A);
M151(M151.Z--Z) = ND2B(M77.Z--A,M93.Z--B);
M153(M153.Z--Z) = NR2B(M122.Z--B,M151.Z--A);
M154(S20--Z) = ND3B(M149.Z--A,M150.Z--B,M153.Z--C);
M150(M150.Z--Z) = AND3B(M45.Z--A,M65.Z--C,M53.Z--B);
M53(M53.Z--Z) = ND3C(M26.Z--A,M28.Z--C,M182.Z--B);
M41(M41.Z--Z) = ND3C(M26.Z--A,M27.Z--B,M16.Z--C);
M73(M73.Z--Z) = ND3C(M26.Z--A,M179.Z--C,M182.Z--B);
M65(M65.Z--Z) = ND3C(M26.Z--A,M16.Z--C,M182.Z--B);
M157(S12--Z) = ND3B(M155.Z--A,M156.Z--B,M81.Z--C);
M156(M156.Z--Z) = AND2B(M49.Z--A,M57.Z--B);
M57(M57.Z--Z) = ND3C(M26.Z--A,M24.Z--C,M182.Z--B);
M119(M119.Z--Z) = AND3B(M11.Z--A,M17.Z--B,M25.Z--C);
M105(M105.Z--Z) = ND3C(M4.Z--A,M179.Z--C,M182.Z--B);
M97(M97.Z--Z) = ND3C(M4.Z--A,M28.Z--C,M182.Z--B);
M21(M21.Z--Z) = ND3B(M4.Z--A,M16.Z--C,M182.Z--B);
M25(M25.Z--Z) = ND3C(M4.Z--A,M24.Z--C,M182.Z--B);
M13(M13.Z--Z) = AND2C(M3.Z--B,M12.Z--A);
M12(M12.Z--Z) = N1B(ROW_ORD2--A);
M26(M26.Z--Z) = AND2C(ROW_ORD1--B,M12.Z--A);
M3(M3.Z--Z) = N1B(ROW_ORD1--A);
M4(M4.Z--Z) = AND2C(ROW_ORD2--A,M3.Z--B);
M11(M11.Z--Z) = ND3B(M6.Z--B,M4.Z--A,M179.Z--C);
M27(M27.Z--Z) = AND2C(ROW_ORD0--A,M14.Z--B);
M5(M5.Z--Z) = N1B(ROW_ORD0--A);
M93(M93.Z--Z) = ND3C(M43.Z--B,M13.Z--A,M179.Z--C);
M45(M45.Z--Z) = ND3C(M43.Z--B,M26.Z--A,M179.Z--C);
M43(M43.Z--Z) = AND2B(FIRST_ROW--B,ROW_ORD0--A);
M14(M14.Z--Z) = N1B(FIRST_ROW--A);
M182(M182.Z--Z) = N1D(M15.Z--A);
M15(M15.Z--Z) = ND2C(M5.Z--A,M14.Z--B);
M6(M6.Z--Z) = AND2B(FIRST_ROW--B,M5.Z--A);
M69(M69.Z--Z) = ND3C(M6.Z--B,M26.Z--A,M179.Z--C);
M49(M49.Z--Z) = ND3C(M26.Z--A,M27.Z--B,M179.Z--C);
M173(M173.Z--Z) = AND3B(M45.Z--B,M41.Z--A,M49.Z--C);
M125(M125.Z--Z) = AND2B(M33.Z--A,M45.Z--B);
M126(M126.Z--Z) = AND2B(M61.Z--A,M65.Z--B);
M127(S32--Z) = ND3B(M125.Z--A,M126.Z--B,M77.Z--C);
M180(M180.Z--Z) = AND3B(M49.Z--A,M57.Z--B,M77.Z--C);
M181(M181.Z--Z) = ND2B(M89.Z--B,M81.Z--A);
M183(M183.Z--Z) = NR2B(M115.Z--B,M181.Z--A);
M184(S00--Z) = ND3B(M158.Z--A,M180.Z--B,M183.Z--C);
M158(M158.Z--Z) = AND3B(M33.Z--A,M45.Z--C,M41.Z--B);
M140(M140.Z--Z) = AND2B(M11.Z--A,M41.Z--B);
M142(S22--Z) = ND3B(M141.Z--B,M140.Z--A,M85.Z--C);
M166(M166.Z--Z) = ND2B(M89.Z--B,M85.Z--A);
M111(M111.Z--Z) = AND2B(M69.Z--A,M89.Z--B);
M89(M89.Z--Z) = ND3C(M13.Z--A,M27.Z--B,M16.Z--C);
M17(M17.Z--Z) = ND3C(M13.Z--A,M16.Z--C,M182.Z--B);
M128(M128.Z--Z) = AND3B(M17.Z--A,M29.Z--C,M25.Z--B);
M134(M134.Z--Z) = AND3B(M49.Z--C,M21.Z--A,M25.Z--B);
M155(M155.Z--Z) = AND2B(M11.Z--A,M21.Z--B);
M172(S02--Z) = ND3B(M155.Z--A,M171.Z--B,M105.Z--C);
M171(M171.Z--Z) = AND2B(M37.Z--A,M53.Z--B);
M114(M114.Z--Z) = AND3B(M49.Z--C,M37.Z--B,M29.Z--A);
M118(S41--Z) = ND3B(M113.Z--A,M114.Z--B,M117.Z--C);
M117(M117.Z--Z) = NR2B(M115.Z--A,M116.Z--B);
M116(M116.Z--Z) = ND2B(M105.Z--A,M109.Z--B);
M131(M131.Z--Z) = ND2B(M105.Z--B,M101.Z--A);
```

```
    M132(M132.Z--Z) = NR2B(M115.Z--A,M131.Z--B);
    M133(S31--Z) = ND3B(M128.Z--A,M129.Z--B,M132.Z--C);
    M129(M129.Z--Z) = AND3B(M69.Z--B,M89.Z--C,M37.Z--A);
    M159(M159.Z--Z) = AND3B(M69.Z--C,M61.Z--A,M65.Z--B);
    M163(S11--Z) = ND3B(M158.Z--A,M159.Z--B,M162.Z--C);
    M162(M162.Z--Z) = NR2B(M161.Z--B,M160.Z--A);
    M160(M160.Z--Z) = ND2B(M73.Z--A,M77.Z--B);
    M165(M165.Z--Z) = AND3B(M61.Z--B,M45.Z--A,M73.Z--C);
    M61(M61.Z--Z) = ND3C(M13.Z--A,M28.Z--C,M182.Z--B);
    M109(M109.Z--Z) = ND3B(M6.Z--B,M13.Z--A,M179.Z--C);
    M137(M137.Z--Z) = ND2B(M109.Z--B,M101.Z--A);
    M138(M138.Z--Z) = NR2B(M136.Z--A,M137.Z--B);
    M139(S30--Z) = ND3B(M134.Z--A,M135.Z--B,M138.Z--C);
    M135(M135.Z--Z) = AND3B(M69.Z--C,M57.Z--B,M53.Z--A);
    M120(M120.Z--Z) = AND3B(M41.Z--A,M57.Z--C,M53.Z--B);
    M124(S40--Z) = ND3B(M119.Z--A,M120.Z--B,M123.Z--C);
    M123(M123.Z--Z) = NR2B(M121.Z--A,M122.Z--B);
    M122(M122.Z--Z) = ND2B(M97.Z--A,M105.Z--B);
    M115(M115.Z--Z) = ND2B(M93.Z--A,M97.Z--B);
    M167(M167.Z--Z) = ND2B(M93.Z--A,M101.Z--B);
    M168(M168.Z--Z) = NR2B(M166.Z--A,M167.Z--B);
    M169(S10--Z) = ND3B(M164.Z--A,M165.Z--B,M168.Z--C);
    M164(M164.Z--Z) = AND3B(M41.Z--C,M29.Z--B,M25.Z--A);
    M29(M29.Z--Z) = ND3C(M26.Z--A,M27.Z--B,M28.Z--C);
    M37(M37.Z--Z) = ND3C(M26.Z--A,M27.Z--B,M24.Z--C);
    M33(M33.Z--Z) = ND3C(M13.Z--A,M24.Z--C,M182.Z--B);
    M101(M101.Z--Z) = ND3C(M13.Z--A,M179.Z--C,M182.Z--B);
    M179(M179.Z--Z) = N1C(M10.Z--A);
    M10(M10.Z--Z) = ND3B(M7.Z--A,M8.Z--B,M9.Z--C);
    M28(M28.Z--Z) = AND3C(LAST_ROW--C,M7.Z--A,M8.Z--B);
    M81(M81.Z--Z) = ND3B(M13.Z--A,M27.Z--B,M28.Z--C);
    M176(M176.Z--Z) = ND2B(M85.Z--B,M81.Z--A);
    M177(M177.Z--Z) = NR2B(M175.Z--A,M176.Z--B);
    M178(S01--Z) = ND3B(M173.Z--A,M174.Z--B,M177.Z--C);
    M174(M174.Z--Z) = AND3B(M61.Z--B,M65.Z--C,M57.Z--A);
    M144(M144.Z--Z) = AND3B(M69.Z--C,M45.Z--A,M65.Z--B);
    M148(S21--Z) = ND3B(M143.Z--A,M144.Z--B,M147.Z--C);
    M147(M147.Z--Z) = NR2B(M145.Z--A,M146.Z--B);
    M146(M146.Z--Z) = ND2B(M97.Z--A,M101.Z--B);
    M112(S42--Z) = ND3B(M110.Z--A,M111.Z--B,M101.Z--C);

  /* extractors *****************************/


  /* type converters *********************/

ANNOTATIONS
{
  BUS BUS_TYPE = "DOT";
}

END MODULE;


/* * * * * * *  Contents of NET file SRDLY.NET  * * * * * * */

/*******************************************************/
/*  Netlist copyright (C) 1989 LSI Logic Corporation  */
/*******************************************************/


MODULE SRDLY;

INPUTS     CP,D,DLY_POL,NOS.1,NOS.0,RESET_,WAIT;
OUTPUTS    Q0,QD;

LEVEL FUNCTION;
DEFINE
  /* implicit connectors *******************/
```

```
CP- = (CP);
RESET_- = (RESET_);
WAIT- = (WAIT);
Q0- = (Q0);
D- = (D);
D- = (D);
NOS-.1 = (NOS.1);
NOS-.0 = (NOS.0);
DLY_POL- = (DLY_POL);
QD- = (QD);


/* part instances **************************/

U2(U2.Z-=Z) = B3A(WAIT-=A);
U1.18(U1.Q-.18=Q) = FD2SA(U1.D-.18=D,U1.Q-.18=TI,CP-=CP,RESET_-=CD,
        U2.Z-=TE);
U1.17(U1.Q-.17=Q) = FD2SA(U1.D-.17=D,U1.Q-.17=TI,CP-=CP,RESET_-=CD,
        U2.Z-=TE);
U1.16(U1.Q-.16=Q) = FD2SA(U1.D-.16=D,U1.Q-.16=TI,CP-=CP,RESET_-=CD,
        U2.Z-=TE);
U1.15(U1.Q-.15=Q) = FD2SA(U1.D-.15=D,U1.Q-.15=TI,CP-=CP,RESET_-=CD,
        U2.Z-=TE);
U1.14(U1.Q-.14=Q) = FD2SA(U1.D-.14=D,U1.Q-.14=TI,CP-=CP,RESET_-=CD,
        U2.Z-=TE);
U1.13(U1.Q-.13=Q) = FD2SA(U1.D-.13=D,U1.Q-.13=TI,CP-=CP,RESET_-=CD,
        U2.Z-=TE);
U1.12(U1.Q-.12=Q) = FD2SA(U1.D-.12=D,U1.Q-.12=TI,CP-=CP,RESET_-=CD,
        U2.Z-=TE);
U1.11(U1.Q-.11=Q) = FD2SA(U1.D-.11=D,U1.Q-.11=TI,CP-=CP,RESET_-=CD,
        U2.Z-=TE);
U1.10(U1.Q-.10=Q) = FD2SA(U1.D-.10=D,U1.Q-.10=TI,CP-=CP,RESET_-=CD,
        U2.Z-=TE);
U1.9(U1.Q-.9=Q) = FD2SA(U1.D-.9=D,U1.Q-.9=TI,CP-=CP,RESET_-=CD,
        U2.Z-=TE);
U1.8(U1.Q-.8=Q) = FD2SA(U1.D-.8=D,U1.Q-.8=TI,CP-=CP,RESET_-=CD,
        U2.Z-=TE);
U1.7(U1.Q-.7=Q) = FD2SA(U1.D-.7=D,U1.Q-.7=TI,CP-=CP,RESET_-=CD,
        U2.Z-=TE);
U1.6(U1.Q-.6=Q) = FD2SA(U1.D-.6=D,U1.Q-.6=TI,CP-=CP,RESET_-=CD,
        U2.Z-=TE);
U1.5(U1.Q-.5=Q) = FD2SA(U1.D-.5=D,U1.Q-.5=TI,CP-=CP,RESET_-=CD,
        U2.Z-=TE);
U1.4(U1.Q-.4=Q) = FD2SA(U1.D-.4=D,U1.Q-.4=TI,CP-=CP,RESET_-=CD,
        U2.Z-=TE);
U1.3(U1.Q-.3=Q) = FD2SA(U1.D-.3=D,U1.Q-.3=TI,CP-=CP,RESET_-=CD,
        U2.Z-=TE);
U1.2(U1.Q-.2=Q) = FD2SA(U1.D-.2=D,U1.Q-.2=TI,CP-=CP,RESET_-=CD,
        U2.Z-=TE);
U1.1(U1.Q-.1=Q) = FD2SA(U1.D-.1=D,U1.Q-.1=TI,CP-=CP,RESET_-=CD,
        U2.Z-=TE);
U1.0(U1.Q-.0=Q) = FD2SA(U1.D-.0=D,U1.Q-.0=TI,CP-=CP,RESET_-=CD,
        U2.Z-=TE);
U0(QD-=Z) = MUX81HB(Q0-=D1,U0.D2-=D2,U0.D3-=D3,U0.D4-=D4,U0.D5-=D5,
        U0.D6-=D6,U0.D7-=D7,D-=D0,U0.B-=B,U0.C-=C,DLY_POL-=A);


/* extractors ******************************/

U1.Q-.9 = (U0.D4-);
U1.Q-.12 = (U0.D5-);
U1.Q-.0 = (Q0-);
U1.Q-.4 = (U0.D2-);
U1.Q-.6 = (U0.D3-);
U1.Q-.14 = (U0.D6-);
U1.Q-.18 = (U0.D7-);
U1.Q-.17 = (M-0.17);
U1.Q-.16 = (M-0.16);
U1.Q-.15 = (M-0.15);
U1.Q-.14 = (M-0.14);
U1.Q-.13 = (M-0.13);
U1.Q-.12 = (M-0.12);
U1.Q-.11 = (M-0.11);
U1.Q-.10 = (M-0.10);
```

```
    U1.Q-.9 = (M-0.9);
    U1.Q-.8 = (M-0.8);
    U1.Q-.7 = (M-0.7);
    U1.Q-.6 = (M-0.6);
    U1.Q-.5 = (M-0.5);
    U1.Q-.4 = (M-0.4);
    U1.Q-.3 = (M-0.3);
    U1.Q-.2 = (M-0.2);
    U1.Q-.1 = (M-0.1);
    U1.Q-.0 = (M-0.0);
    U1.D-.18 = (M-0.17);
    U1.D-.17 = (M-0.16);
    U1.D-.16 = (M-0.15);
    U1.D-.15 = (M-0.14);
    U1.D-.14 = (M-0.13);
    U1.D-.13 = (M-0.12);
    U1.D-.12 = (M-0.11);
    U1.D-.11 = (M-0.10);
    U1.D-.10 = (M-0.9);
    U1.D-.9 = (M-0.8);
    U1.D-.8 = (M-0.7);
    U1.D-.7 = (M-0.6);
    U1.D-.6 = (M-0.5);
    U1.D-.5 = (M-0.4);
    U1.D-.4 = (M-0.3);
    U1.D-.3 = (M-0.2);
    U1.D-.2 = (M-0.1);
    U1.D-.1 = (M-0.0);
    U1.D-.0 = (D-);
    NOS-.0 = (U0.B-);
    NOS-.1 = (U0.C-);

  /* type converters ********************/

ANNOTATIONS
{
  BUS BUS_TYPE = "DOT";
}

END MODULE;


/* * * * * * *  Contents of NET file INP_MUX.NET  * * * * * * */

/*****************************************************/
/*  Netlist copyright (C) 1989 LSI Logic Corporation  */
/*****************************************************/


MODULE INP_MUX;

INPUTS      CP,FIRST_ROW,LAST_MINUS1,LAST_ROW,RC0.7,RC0.6,RC0.5,
            RC0.4,RC0.3,RC0.2,RC0.1,RC0.0,RC1.7,RC1.6,RC1.5,RC1.4,
            RC1.3,RC1.2,RC1.1,RC1.0,RC2.7,RC2.6,RC2.5,RC2.4,RC2.3,
            RC2.2,RC2.1,RC2.0,RC3.7,RC3.6,RC3.5,RC3.4,RC3.3,RC3.2,
            RC3.1,RC3.0,RC4.7,RC4.6,RC4.5,RC4.4,RC4.3,RC4.2,RC4.1,
            RC4.0,RESET_,ROW_ORDR.2,ROW_ORDR.1,ROW_ORDR.0,
            SECOND_ROW,STB_I,S_MODE,WAIT;
OUTPUTS     D0.7,D0.6,D0.5,D0.4,D0.3,D0.2,D0.1,D0.0,D1.7,D1.6,
            D1.5,D1.4,D1.3,D1.2,D1.1,D1.0,D2.7,D2.6,D2.5,D2.4,
            D2.3,D2.2,D2.1,D2.0,D3.7,D3.6,D3.5,D3.4,D3.3,D3.2,
            D3.1,D3.0,D4.7,D4.6,D4.5,D4.4,D4.3,D4.2,D4.1,D4.0;

LEVEL FUNCTION;
DEFINE
  /* implicit connectors ******************/

    RC0-.7 = (RC0.7);
    RC0-.6 = (RC0.6);
    RC0-.5 = (RC0.5);
    RC0-.4 = (RC0.4);
    RC0-.3 = (RC0.3);
    RC0-.2 = (RC0.2);
    RC0-.1 = (RC0.1);
```

```
RC0-.0 = (RC0.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
STB_I- = (STB_I);
CP- = (CP);
RESET_- = (RESET_);
D4-.7 = (D4.7);
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
D3-.7 = (D3.7);
D3-.6 = (D3.6);
D3-.5 = (D3.5);
D3-.4 = (D3.4);
D3-.3 = (D3.3);
D3-.2 = (D3.2);
D3-.1 = (D3.1);
D3-.0 = (D3.0);
D2-.7 = (D2.7);
D2-.6 = (D2.6);
D2-.5 = (D2.5);
D2-.4 = (D2.4);
D2-.3 = (D2.3);
D2-.2 = (D2.2);
D2-.1 = (D2.1);
D2-.0 = (D2.0);
D1-.7 = (D1.7);
D1-.6 = (D1.6);
D1-.5 = (D1.5);
D1-.4 = (D1.4);
D1-.3 = (D1.3);
D1-.2 = (D1.2);
D1-.1 = (D1.1);
D1-.0 = (D1.0);
D0-.7 = (D0.7);
D0-.6 = (D0.6);
D0-.5 = (D0.5);
D0-.4 = (D0.4);
D0-.3 = (D0.3);
D0-.2 = (D0.2);
D0-.1 = (D0.1);
D0-.0 = (D0.0);
```

```
  S_MODE- = (S_MODE);
  LAST_ROW- = (LAST_ROW);
  FIRST_ROW- = (FIRST_ROW);
  LAST_MINUS1- = (LAST_MINUS1);
  SECOND_ROW- = (SECOND_ROW);
  ROW_ORDR-.2 = (ROW_ORDR.2);
  ROW_ORDR-.1 = (ROW_ORDR.1);
  ROW_ORDR-.0 = (ROW_ORDR.0);
  WAIT- = (WAIT);


/* part instances ***************************/

  U2(U2.Z-=Z) = N1A(S_MODE-=A);
  U3.3(U3.Z-.3=Z) = AND2B(U2.Z-=B,U3.A-.3=A);
  U3.2(U3.Z-.2=Z) = AND2B(U2.Z-=B,U3.A-.2=A);
  U3.1(U3.Z-.1=Z) = AND2B(U2.Z-=B,U3.A-.1=A);
  U3.0(U3.Z-.0=Z) = AND2B(U2.Z-=B,U3.A-.0=A);
  U1(U1.S42-=S42,U1.S41-=S41,U1.S40-=S40,U1.S32-=S32,U1.S31-=S31,
         U1.S30-=S30,U1.S22-=S22,U1.S21-=S21,U1.S20-=S20,
         U1.S12-=S12,U1.S11-=S11,U1.S10-=S10,U1.S02-=S02,
         U1.S01-=S01,U1.S00-=S00) = INPMUX_DECV2(U1.FIRST_ROW-=FIRST_ROW,
         U1.SECOND_ROW-=SECOND_ROW,U1.LAST_MINUS1-=LAST_MINUS1,
         U1.LAST_ROW-=LAST_ROW,U1.ROW_ORD2-=ROW_ORD2,
         U1.ROW_ORD1-=ROW_ORD1,U1.ROW_ORD0-=ROW_ORD0);
  U0(D4-.7=D4.7,D4-.6=D4.6,D4-.5=D4.5,D4-.4=D4.4,D4-.3=D4.3,
         D4-.2=D4.2,D4-.1=D4.1,D4-.0=D4.0,D3-.7=D3.7,D3-.6=D3.6,
         D3-.5=D3.5,D3-.4=D3.4,D3-.3=D3.3,D3-.2=D3.2,D3-.1=D3.1,
         D3-.0=D3.0,D2-.7=D2.7,D2-.6=D2.6,D2-.5=D2.5,D2-.4=D2.4,
         D2-.3=D2.3,D2-.2=D2.2,D2-.1=D2.1,D2-.0=D2.0,D1-.7=D1.7,
         D1-.6=D1.6,D1-.5=D1.5,D1-.4=D1.4,D1-.3=D1.3,D1-.2=D1.2,
         D1-.1=D1.1,D1-.0=D1.0,D0-.7=D0.7,D0-.6=D0.6,D0-.5=D0.5,
         D0-.4=D0.4,D0-.3=D0.3,D0-.2=D0.2,D0-.1=D0.1,D0-.0=D0.0)
          = DATA_MUXV2(RC0-.7=RC0.7,RC0-.6=RC0.6,RC0-.5=RC0.5,
         RC0-.4=RC0.4,RC0-.3=RC0.3,RC0-.2=RC0.2,RC0-.1=RC0.1,
         RC0-.0=RC0.0,RC1-.7=RC1.7,RC1-.6=RC1.6,RC1-.5=RC1.5,
         RC1-.4=RC1.4,RC1-.3=RC1.3,RC1-.2=RC1.2,RC1-.1=RC1.1,
         RC1-.0=RC1.0,RC2-.7=RC2.7,RC2-.6=RC2.6,RC2-.5=RC2.5,
         RC2-.4=RC2.4,RC2-.3=RC2.3,RC2-.2=RC2.2,RC2-.1=RC2.1,
         RC2-.0=RC2.0,RC3-.7=RC3.7,RC3-.6=RC3.6,RC3-.5=RC3.5,
         RC3-.4=RC3.4,RC3-.3=RC3.3,RC3-.2=RC3.2,RC3-.1=RC3.1,
         RC3-.0=RC3.0,RC4-.7=RC4.7,RC4-.6=RC4.6,RC4-.5=RC4.5,
         RC4-.4=RC4.4,RC4-.3=RC4.3,RC4-.2=RC4.2,RC4-.1=RC4.1,
         RC4-.0=RC4.0,STB_I-=STB_I,WAIT-=WAIT,CP-=CP,RESET_-=RESET_,
         U0.S4-.2=S4.2,U0.S4-.1=S4.1,U0.S4-.0=S4.0,U0.S3-.2=S3.2,
         U0.S3-.1=S3.1,U0.S3-.0=S3.0,U0.S2-.2=S2.2,U0.S2-.1=S2.1,
         U0.S2-.0=S2.0,U0.S1-.2=S1.2,U0.S1-.1=S1.1,U0.S1-.0=S1.0,
         U0.S0-.2=S0.2,U0.S0-.1=S0.1,U0.S0-.0=S0.0);


/* extractors ******************************/

  U3.Z-.2 = (U1.LAST_MINUS1-);
  U3.A-.3 = (LAST_ROW-);
  U3.A-.0 = (FIRST_ROW-);
  U3.A-.2 = (LAST_MINUS1-);
  U3.A-.1 = (SECOND_ROW-);
  U3.Z-.1 = (U1.SECOND_ROW-);
  U3.Z-.0 = (U1.FIRST_ROW-);
  U3.Z-.3 = (U1.LAST_ROW-);
  U0.S4-.2 = (U1.S42-);
  U0.S4-.1 = (U1.S41-);
  U0.S4-.0 = (U1.S40-);
  U0.S3-.1 = (U1.S31-);
  U0.S3-.2 = (U1.S32-);
  U0.S3-.0 = (U1.S30-);
  U0.S2-.1 = (U1.S21-);
  U0.S2-.2 = (U1.S22-);
  U0.S2-.0 = (U1.S20-);
  U0.S1-.1 = (U1.S11-);
  U0.S1-.2 = (U1.S12-);
  U0.S1-.0 = (U1.S10-);
  U0.S0-.1 = (U1.S01-);
  U0.S0-.0 = (U1.S00-);
  ROW_ORDR-.1 = (U1.ROW_ORD1-);
  ROW_ORDR-.2 = (U1.ROW_ORD2-);
```

```
    ROW_ORDR-.0 = (U1.ROW_ORD0-);
    U0.S0-.2 = (U1.S02-);

  /* type converters *********************/

ANNOTATIONS
{
  BUS BUS_TYPE = "DOT";
}

END MODULE;


/* * * * * * *  Contents of NET file DEC24.NET  * * * * * * */

/*******************************************************/
/*  Netlist copyright (C) 1989 LSI Logic Corporation  */
/*******************************************************/


MODULE DEC24;

INPUTS      SEL.1,SEL.0;
OUTPUTS     Z.3,Z.2,Z.1,Z.0;

LEVEL FUNCTION;
DEFINE
  /* implicit connectors *******************/

    Z-.3 = (Z.3);
    Z-.2 = (Z.2);
    Z-.1 = (Z.1);
    Z-.0 = (Z.0);
    SEL-.1 = (SEL.1);
    SEL-.0 = (SEL.0);

  /* part instances *************************/

    U0(U0.Z-=Z) = AND2C(U3.Z2-=A,U4.Z2-=B);
    U4(U4.Z1-=Z1,U4.Z2-=Z2) = B2IA(U4.A-=A);
    U5(U5.Z-=Z) = AND2C(U3.Z1-=A,U4.Z1-=B);
    U2(U2.Z-=Z) = AND2C(U3.Z2-=A,U4.Z1-=B);
    U1(U1.Z-=Z) = AND2C(U4.Z2-=B,U3.Z1-=A);
    U3(U3.Z2-=Z2,U3.Z1-=Z1) = B2IA(U3.A-=A);

  /* extractors *****************************/

    SEL-.1 = (U4.A-);
    Z-.3 = (U0.Z-);
    Z-.0 = (U5.Z-);
    Z-.1 = (U2.Z-);
    Z-.2 = (U1.Z-);
    SEL-.0 = (U3.A-);

  /* type converters *********************/

ANNOTATIONS
{
  BUS BUS_TYPE = "DOT";
}

END MODULE;


/* * * * * * *  Contents of NET file SR5W13V2.NET  * * * * * * */

/*******************************************************/
/*  Netlist copyright (C) 1989 LSI Logic Corporation  */
/*******************************************************/
```

```
MODULE SR5W13V2;

INPUTS      ASPR,CP,D.12,D.11,D.10,D.9,D.8,D.7,D.6,D.5,D.4,D.3,
            D.2,D.1,D.0,DUPLICATE,PDI.12,PDI.11,PDI.10,PDI.9,
            PDI.8,PDI.7,PDI.6,PDI.5,PDI.4,PDI.3,PDI.2,PDI.1,PDI.0,
            PLR_CS_,RESET_,SE,TST,WAIT,WR_;
OUTPUTS     Q0.12,Q0.11,Q0.10,Q0.9,Q0.8,Q0.7,Q0.6,Q0.5,Q0.4,Q0.3,
            Q0.2,Q0.1,Q0.0,Q1.12,Q1.11,Q1.10,Q1.9,Q1.8,Q1.7,Q1.6,
            Q1.5,Q1.4,Q1.3,Q1.2,Q1.1,Q1.0,Q2.12,Q2.11,Q2.10,Q2.9,
            Q2.8,Q2.7,Q2.6,Q2.5,Q2.4,Q2.3,Q2.2,Q2.1,Q2.0,Q3.12,
            Q3.11,Q3.10,Q3.9,Q3.8,Q3.7,Q3.6,Q3.5,Q3.4,Q3.3,Q3.2,
            Q3.1,Q3.0,Q4.12,Q4.11,Q4.10,Q4.9,Q4.8,Q4.7,Q4.6,Q4.5,
            Q4.4,Q4.3,Q4.2,Q4.1,Q4.0;

LEVEL FUNCTION;
DEFINE
  /* implicit connectors ********************/

    Q1-.12 = (Q1.12);
    Q1-.11 = (Q1.11);
    Q1-.10 = (Q1.10);
    Q1-.9 = (Q1.9);
    Q1-.8 = (Q1.8);
    Q1-.7 = (Q1.7);
    Q1-.6 = (Q1.6);
    Q1-.5 = (Q1.5);
    Q1-.4 = (Q1.4);
    Q1-.3 = (Q1.3);
    Q1-.2 = (Q1.2);
    Q1-.1 = (Q1.1);
    Q1-.0 = (Q1.0);
    Q4-.12 = (Q4.12);
    Q4-.11 = (Q4.11);
    Q4-.10 = (Q4.10);
    Q4-.9 = (Q4.9);
    Q4-.8 = (Q4.8);
    Q4-.7 = (Q4.7);
    Q4-.6 = (Q4.6);
    Q4-.5 = (Q4.5);
    Q4-.4 = (Q4.4);
    Q4-.3 = (Q4.3);
    Q4-.2 = (Q4.2);
    Q4-.1 = (Q4.1);
    Q4-.0 = (Q4.0);
    Q3-.12 = (Q3.12);
    Q3-.11 = (Q3.11);
    Q3-.10 = (Q3.10);
    Q3-.9 = (Q3.9);
    Q3-.8 = (Q3.8);
    Q3-.7 = (Q3.7);
    Q3-.6 = (Q3.6);
    Q3-.5 = (Q3.5);
    Q3-.4 = (Q3.4);
    Q3-.3 = (Q3.3);
    Q3-.2 = (Q3.2);
    Q3-.1 = (Q3.1);
    Q3-.0 = (Q3.0);
    RESET_- = (RESET_);
    D-.12 = (D.12);
    D-.11 = (D.11);
    D-.10 = (D.10);
    D-.9 = (D.9);
    D-.8 = (D.8);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    TST- = (TST);
    PDI-.12 = (PDI.12);
    PDI-.11 = (PDI.11);
    PDI-.10 = (PDI.10);
```

```
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
WR_- = (WR_);
PLR_CS_- = (PLR_CS_);
CP- = (CP);
DUPLICATE- = (DUPLICATE);
ASPR- = (ASPR);
SE- = (SE);
WAIT- = (WAIT);
Q0-.12 = (Q0.12);
Q0-.11 = (Q0.11);
Q0-.10 = (Q0.10);
Q0-.9 = (Q0.9);
Q0-.8 = (Q0.8);
Q0-.7 = (Q0.7);
Q0-.6 = (Q0.6);
Q0-.5 = (Q0.5);
Q0-.4 = (Q0.4);
Q0-.3 = (Q0.3);
Q0-.2 = (Q0.2);
Q0-.1 = (Q0.1);
Q0-.0 = (Q0.0);
Q2-.12 = (Q2.12);
Q2-.11 = (Q2.11);
Q2-.10 = (Q2.10);
Q2-.9 = (Q2.9);
Q2-.8 = (Q2.8);
Q2-.7 = (Q2.7);
Q2-.6 = (Q2.6);
Q2-.5 = (Q2.5);
Q2-.4 = (Q2.4);
Q2-.3 = (Q2.3);
Q2-.2 = (Q2.2);
Q2-.1 = (Q2.1);
Q2-.0 = (Q2.0);


/* part instances **************************/

U13.12(Q1-.12=Q) = LD1A(U18.Z-=G,U11.Q-.12=D);
U13.11(Q1-.11=Q) = LD1A(U18.Z-=G,U11.Q-.11=D);
U13.10(Q1-.10=Q) = LD1A(U18.Z-=G,U11.Q-.10=D);
U13.9(Q1-.9=Q) = LD1A(U18.Z-=G,U11.Q-.9=D);
U13.8(Q1-.8=Q) = LD1A(U18.Z-=G,U11.Q-.8=D);
U13.7(Q1-.7=Q) = LD1A(U18.Z-=G,U11.Q-.7=D);
U13.6(Q1-.6=Q) = LD1A(U18.Z-=G,U11.Q-.6=D);
U13.5(Q1-.5=Q) = LD1A(U18.Z-=G,U11.Q-.5=D);
U13.4(Q1-.4=Q) = LD1A(U18.Z-=G,U11.Q-.4=D);
U13.3(Q1-.3=Q) = LD1A(U18.Z-=G,U11.Q-.3=D);
U13.2(Q1-.2=Q) = LD1A(U18.Z-=G,U11.Q-.2=D);
U13.1(Q1-.1=Q) = LD1A(U18.Z-=G,U11.Q-.1=D);
U13.0(Q1-.0=Q) = LD1A(U18.Z-=G,U11.Q-.0=D);
U21(U21.Z-=Z) = N1E(U2.Z-=A);
U20(U20.Z-=Z) = N1E(U2.Z-=A);
U3.12(Q4-.12=Q) = LD1A(U20.Z-=G,U7.Q-.12=D);
U3.11(Q4-.11=Q) = LD1A(U20.Z-=G,U7.Q-.11=D);
U3.10(Q4-.10=Q) = LD1A(U20.Z-=G,U7.Q-.10=D);
U3.9(Q4-.9=Q) = LD1A(U20.Z-=G,U7.Q-.9=D);
U3.8(Q4-.8=Q) = LD1A(U20.Z-=G,U7.Q-.8=D);
U3.7(Q4-.7=Q) = LD1A(U20.Z-=G,U7.Q-.7=D);
U3.6(Q4-.6=Q) = LD1A(U20.Z-=G,U7.Q-.6=D);
U3.5(Q4-.5=Q) = LD1A(U20.Z-=G,U7.Q-.5=D);
U3.4(Q4-.4=Q) = LD1A(U20.Z-=G,U7.Q-.4=D);
U3.3(Q4-.3=Q) = LD1A(U20.Z-=G,U7.Q-.3=D);
U3.2(Q4-.2=Q) = LD1A(U20.Z-=G,U7.Q-.2=D);
U3.1(Q4-.1=Q) = LD1A(U20.Z-=G,U7.Q-.1=D);
U3.0(Q4-.0=Q) = LD1A(U20.Z-=G,U7.Q-.0=D);
U19(U19.Z-=Z) = N1E(U2.Z-=A);
```

```
U4.12(Q3-.12=Q) = LD1A(U19.Z-=G,U9.Q-.12=D);
U4.11(Q3-.11=Q) = LD1A(U19.Z-=G,U9.Q-.11=D);
U4.10(Q3-.10=Q) = LD1A(U19.Z-=G,U9.Q-.10=D);
U4.9(Q3-.9=Q) = LD1A(U19.Z-=G,U9.Q-.9=D);
U4.8(Q3-.8=Q) = LD1A(U19.Z-=G,U9.Q-.8=D);
U4.7(Q3-.7=Q) = LD1A(U19.Z-=G,U9.Q-.7=D);
U4.6(Q3-.6=Q) = LD1A(U19.Z-=G,U9.Q-.6=D);
U4.5(Q3-.5=Q) = LD1A(U19.Z-=G,U9.Q-.5=D);
U4.4(Q3-.4=Q) = LD1A(U19.Z-=G,U9.Q-.4=D);
U4.3(Q3-.3=Q) = LD1A(U19.Z-=G,U9.Q-.3=D);
U4.2(Q3-.2=Q) = LD1A(U19.Z-=G,U9.Q-.2=D);
U4.1(Q3-.1=Q) = LD1A(U19.Z-=G,U9.Q-.1=D);
U4.0(Q3-.0=Q) = LD1A(U19.Z-=G,U9.Q-.0=D);
U6(U6.Z-=Z) = B3A(RESET_-=A);
U1.12(U1.Q-.12=Q) = FD2SA(PDI-.12=D,U1.Q-.12=TI,WR_-=CP,PLR_CS_-=TE,
        U6.Z-=CD);
U1.11(U1.Q-.11=Q) = FD2SA(PDI-.11=D,U1.Q-.11=TI,WR_-=CP,PLR_CS_-=TE,
        U6.Z-=CD);
U1.10(U1.Q-.10=Q) = FD2SA(PDI-.10=D,U1.Q-.10=TI,WR_-=CP,PLR_CS_-=TE,
        U6.Z-=CD);
U1.9(U1.Q-.9=Q) = FD2SA(PDI-.9=D,U1.Q-.9=TI,WR_-=CP,PLR_CS_-=TE,
        U6.Z-=CD);
U1.8(U1.Q-.8=Q) = FD2SA(PDI-.8=D,U1.Q-.8=TI,WR_-=CP,PLR_CS_-=TE,
        U6.Z-=CD);
U1.7(U1.Q-.7=Q) = FD2SA(PDI-.7=D,U1.Q-.7=TI,WR_-=CP,PLR_CS_-=TE,
        U6.Z-=CD);
U1.6(U1.Q-.6=Q) = FD2SA(PDI-.6=D,U1.Q-.6=TI,WR_-=CP,PLR_CS_-=TE,
        U6.Z-=CD);
U1.5(U1.Q-.5=Q) = FD2SA(PDI-.5=D,U1.Q-.5=TI,WR_-=CP,PLR_CS_-=TE,
        U6.Z-=CD);
U1.4(U1.Q-.4=Q) = FD2SA(PDI-.4=D,U1.Q-.4=TI,WR_-=CP,PLR_CS_-=TE,
        U6.Z-=CD);
U1.3(U1.Q-.3=Q) = FD2SA(PDI-.3=D,U1.Q-.3=TI,WR_-=CP,PLR_CS_-=TE,
        U6.Z-=CD);
U1.2(U1.Q-.2=Q) = FD2SA(PDI-.2=D,U1.Q-.2=TI,WR_-=CP,PLR_CS_-=TE,
        U6.Z-=CD);
U1.1(U1.Q-.1=Q) = FD2SA(PDI-.1=D,U1.Q-.1=TI,WR_-=CP,PLR_CS_-=TE,
        U6.Z-=CD);
U1.0(U1.Q-.0=Q) = FD2SA(PDI-.0=D,U1.Q-.0=TI,WR_-=CP,PLR_CS_-=TE,
        U6.Z-=CD);
U14.12(U14.Z-.12=Z) = MX21LB(D-.12=A,TST-=S,U1.Q-.12=B);
U14.11(U14.Z-.11=Z) = MX21LB(D-.11=A,TST-=S,U1.Q-.11=B);
U14.10(U14.Z-.10=Z) = MX21LB(D-.10=A,TST-=S,U1.Q-.10=B);
U14.9(U14.Z-.9=Z) = MX21LB(D-.9=A,TST-=S,U1.Q-.9=B);
U14.8(U14.Z-.8=Z) = MX21LB(D-.8=A,TST-=S,U1.Q-.8=B);
U14.7(U14.Z-.7=Z) = MX21LB(D-.7=A,TST-=S,U1.Q-.7=B);
U14.6(U14.Z-.6=Z) = MX21LB(D-.6=A,TST-=S,U1.Q-.6=B);
U14.5(U14.Z-.5=Z) = MX21LB(D-.5=A,TST-=S,U1.Q-.5=B);
U14.4(U14.Z-.4=Z) = MX21LB(D-.4=A,TST-=S,U1.Q-.4=B);
U14.3(U14.Z-.3=Z) = MX21LB(D-.3=A,TST-=S,U1.Q-.3=B);
U14.2(U14.Z-.2=Z) = MX21LB(D-.2=A,TST-=S,U1.Q-.2=B);
U14.1(U14.Z-.1=Z) = MX21LB(D-.1=A,TST-=S,U1.Q-.1=B);
U14.0(U14.Z-.0=Z) = MX21LB(D-.0=A,TST-=S,U1.Q-.0=B);
U0.12(U0.Z-.12=Z) = N1C(U12.Q-.12=A);
U0.11(U0.Z-.11=Z) = N1C(U12.Q-.11=A);
U0.10(U0.Z-.10=Z) = N1C(U12.Q-.10=A);
U0.9(U0.Z-.9=Z) = N1C(U12.Q-.9=A);
U0.8(U0.Z-.8=Z) = N1C(U12.Q-.8=A);
U0.7(U0.Z-.7=Z) = N1C(U12.Q-.7=A);
U0.6(U0.Z-.6=Z) = N1C(U12.Q-.6=A);
U0.5(U0.Z-.5=Z) = N1C(U12.Q-.5=A);
U0.4(U0.Z-.4=Z) = N1C(U12.Q-.4=A);
U0.3(U0.Z-.3=Z) = N1C(U12.Q-.3=A);
U0.2(U0.Z-.2=Z) = N1C(U12.Q-.2=A);
U0.1(U0.Z-.1=Z) = N1C(U12.Q-.1=A);
U0.0(U0.Z-.0=Z) = N1C(U12.Q-.0=A);
U8(U8.Z-=Z) = OR2C(DUPLICATE-=A,U21.Z-=B);
U12.12(U12.Q-.12=Q) = FD2SA(U14.Z-.12=D,CP-=CP,U6.Z-=CD,
        U12.Q-.12=TI,U8.Z-=TE);
U12.11(U12.Q-.11=Q) = FD2SA(U14.Z-.11=D,CP-=CP,U6.Z-=CD,
        U12.Q-.11=TI,U8.Z-=TE);
U12.10(U12.Q-.10=Q) = FD2SA(U14.Z-.10=D,CP-=CP,U6.Z-=CD,
        U12.Q-.10=TI,U8.Z-=TE);
```

```
U12.9(U12.Q-.9=Q) = FD2SA(U14.Z-.9=D,CP-=CP,U6.Z-=CD,U12.Q-.9=TI,
        U8.Z-=TE);
U12.8(U12.Q-.8=Q) = FD2SA(U14.Z-.8=D,CP-=CP,U6.Z-=CD,U12.Q-.8=TI,
        U8.Z-=TE);
U12.7(U12.Q-.7=Q) = FD2SA(U14.Z-.7=D,CP-=CP,U6.Z-=CD,U12.Q-.7=TI,
        U8.Z-=TE);
U12.6(U12.Q-.6=Q) = FD2SA(U14.Z-.6=D,CP-=CP,U6.Z-=CD,U12.Q-.6=TI,
        U8.Z-=TE);
U12.5(U12.Q-.5=Q) = FD2SA(U14.Z-.5=D,CP-=CP,U6.Z-=CD,U12.Q-.5=TI,
        U8.Z-=TE);
U12.4(U12.Q-.4=Q) = FD2SA(U14.Z-.4=D,CP-=CP,U6.Z-=CD,U12.Q-.4=TI,
        U8.Z-=TE);
U12.3(U12.Q-.3=Q) = FD2SA(U14.Z-.3=D,CP-=CP,U6.Z-=CD,U12.Q-.3=TI,
        U8.Z-=TE);
U12.2(U12.Q-.2=Q) = FD2SA(U14.Z-.2=D,CP-=CP,U6.Z-=CD,U12.Q-.2=TI,
        U8.Z-=TE);
U12.1(U12.Q-.1=Q) = FD2SA(U14.Z-.1=D,CP-=CP,U6.Z-=CD,U12.Q-.1=TI,
        U8.Z-=TE);
U12.0(U12.Q-.0=Q) = FD2SA(U14.Z-.0=D,CP-=CP,U6.Z-=CD,U12.Q-.0=TI,
        U8.Z-=TE);
U9.12(U9.Q-.12=Q) = FD2SA(CP-=CP,U6.Z-=CD,U16.Z-=TE,U9.Q-.12=TI,
        U10.Q-.12=D);
U9.11(U9.Q-.11=Q) = FD2SA(CP-=CP,U6.Z-=CD,U16.Z-=TE,U9.Q-.11=TI,
        U10.Q-.11=D);
U9.10(U9.Q-.10=Q) = FD2SA(CP-=CP,U6.Z-=CD,U16.Z-=TE,U9.Q-.10=TI,
        U10.Q-.10=D);
U9.9(U9.Q-.9=Q) = FD2SA(CP-=CP,U6.Z-=CD,U16.Z-=TE,U9.Q-.9=TI,
        U10.Q-.9=D);
U9.8(U9.Q-.8=Q) = FD2SA(CP-=CP,U6.Z-=CD,U16.Z-=TE,U9.Q-.8=TI,
        U10.Q-.8=D);
U9.7(U9.Q-.7=Q) = FD2SA(CP-=CP,U6.Z-=CD,U16.Z-=TE,U9.Q-.7=TI,
        U10.Q-.7=D);
U9.6(U9.Q-.6=Q) = FD2SA(CP-=CP,U6.Z-=CD,U16.Z-=TE,U9.Q-.6=TI,
        U10.Q-.6=D);
U9.5(U9.Q-.5=Q) = FD2SA(CP-=CP,U6.Z-=CD,U16.Z-=TE,U9.Q-.5=TI,
        U10.Q-.5=D);
U9.4(U9.Q-.4=Q) = FD2SA(CP-=CP,U6.Z-=CD,U16.Z-=TE,U9.Q-.4=TI,
        U10.Q-.4=D);
U9.3(U9.Q-.3=Q) = FD2SA(CP-=CP,U6.Z-=CD,U16.Z-=TE,U9.Q-.3=TI,
        U10.Q-.3=D);
U9.2(U9.Q-.2=Q) = FD2SA(CP-=CP,U6.Z-=CD,U16.Z-=TE,U9.Q-.2=TI,
        U10.Q-.2=D);
U9.1(U9.Q-.1=Q) = FD2SA(CP-=CP,U6.Z-=CD,U16.Z-=TE,U9.Q-.1=TI,
        U10.Q-.1=D);
U9.0(U9.Q-.0=Q) = FD2SA(CP-=CP,U6.Z-=CD,U16.Z-=TE,U9.Q-.0=TI,
        U10.Q-.0=D);
U7.12(U7.Q-.12=Q) = FD2SA(CP-=CP,U6.Z-=CD,U16.Z-=TE,U7.Q-.12=TI,
        U9.Q-.12=D);
U7.11(U7.Q-.11=Q) = FD2SA(CP-=CP,U6.Z-=CD,U16.Z-=TE,U7.Q-.11=TI,
        U9.Q-.11=D);
U7.10(U7.Q-.10=Q) = FD2SA(CP-=CP,U6.Z-=CD,U16.Z-=TE,U7.Q-.10=TI,
        U9.Q-.10=D);
U7.9(U7.Q-.9=Q) = FD2SA(CP-=CP,U6.Z-=CD,U16.Z-=TE,U7.Q-.9=TI,
        U9.Q-.9=D);
U7.8(U7.Q-.8=Q) = FD2SA(CP-=CP,U6.Z-=CD,U16.Z-=TE,U7.Q-.8=TI,
        U9.Q-.8=D);
U7.7(U7.Q-.7=Q) = FD2SA(CP-=CP,U6.Z-=CD,U16.Z-=TE,U7.Q-.7=TI,
        U9.Q-.7=D);
U7.6(U7.Q-.6=Q) = FD2SA(CP-=CP,U6.Z-=CD,U16.Z-=TE,U7.Q-.6=TI,
        U9.Q-.6=D);
U7.5(U7.Q-.5=Q) = FD2SA(CP-=CP,U6.Z-=CD,U16.Z-=TE,U7.Q-.5=TI,
        U9.Q-.5=D);
U7.4(U7.Q-.4=Q) = FD2SA(CP-=CP,U6.Z-=CD,U16.Z-=TE,U7.Q-.4=TI,
        U9.Q-.4=D);
U7.3(U7.Q-.3=Q) = FD2SA(CP-=CP,U6.Z-=CD,U16.Z-=TE,U7.Q-.3=TI,
        U9.Q-.3=D);
U7.2(U7.Q-.2=Q) = FD2SA(CP-=CP,U6.Z-=CD,U16.Z-=TE,U7.Q-.2=TI,
        U9.Q-.2=D);
U7.1(U7.Q-.1=Q) = FD2SA(CP-=CP,U6.Z-=CD,U16.Z-=TE,U7.Q-.1=TI,
        U9.Q-.1=D);
U7.0(U7.Q-.0=Q) = FD2SA(CP-=CP,U6.Z-=CD,U16.Z-=TE,U7.Q-.0=TI,
        U9.Q-.0=D);
U16(U16.Z-=Z) = N1E(U2.Z-=A);
U17(U17.Z-=Z) = N1C(WAIT-=A);
U2(U2.Z-=Z) = AND3C(ASPR-=B,SE-=A,U17.Z-=C);
U18(U18.Z-=Z) = N1E(U2.Z-=A);
```

```
U15.12(Q0-.12=Q) = LD1A(U18.Z-=G,U0.Z-.12=D);
U15.11(Q0-.11=Q) = LD1A(U18.Z-=G,U0.Z-.11=D);
U15.10(Q0-.10=Q) = LD1A(U18.Z-=G,U0.Z-.10=D);
U15.9(Q0-.9=Q) = LD1A(U18.Z-=G,U0.Z-.9=D);
U15.8(Q0-.8=Q) = LD1A(U18.Z-=G,U0.Z-.8=D);
U15.7(Q0-.7=Q) = LD1A(U18.Z-=G,U0.Z-.7=D);
U15.6(Q0-.6=Q) = LD1A(U18.Z-=G,U0.Z-.6=D);
U15.5(Q0-.5=Q) = LD1A(U18.Z-=G,U0.Z-.5=D);
U15.4(Q0-.4=Q) = LD1A(U18.Z-=G,U0.Z-.4=D);
U15.3(Q0-.3=Q) = LD1A(U18.Z-=G,U0.Z-.3=D);
U15.2(Q0-.2=Q) = LD1A(U18.Z-=G,U0.Z-.2=D);
U15.1(Q0-.1=Q) = LD1A(U18.Z-=G,U0.Z-.1=D);
U15.0(Q0-.0=Q) = LD1A(U18.Z-=G,U0.Z-.0=D);
U11.12(U11.Q-.12=Q) = FD2SA(CP-=CP,U6.Z-=CD,U11.Q-.12=TI,
        U0.Z-.12=D,U21.Z-=TE);
U11.11(U11.Q-.11=Q) = FD2SA(CP-=CP,U6.Z-=CD,U11.Q-.11=TI,
        U0.Z-.11=D,U21.Z-=TE);
U11.10(U11.Q-.10=Q) = FD2SA(CP-=CP,U6.Z-=CD,U11.Q-.10=TI,
        U0.Z-.10=D,U21.Z-=TE);
U11.9(U11.Q-.9=Q) = FD2SA(CP-=CP,U6.Z-=CD,U11.Q-.9=TI,U0.Z-.9=D,
        U21.Z-=TE);
U11.8(U11.Q-.8=Q) = FD2SA(CP-=CP,U6.Z-=CD,U11.Q-.8=TI,U0.Z-.8=D,
        U21.Z-=TE);
U11.7(U11.Q-.7=Q) = FD2SA(CP-=CP,U6.Z-=CD,U11.Q-.7=TI,U0.Z-.7=D,
        U21.Z-=TE);
U11.6(U11.Q-.6=Q) = FD2SA(CP-=CP,U6.Z-=CD,U11.Q-.6=TI,U0.Z-.6=D,
        U21.Z-=TE);
U11.5(U11.Q-.5=Q) = FD2SA(CP-=CP,U6.Z-=CD,U11.Q-.5=TI,U0.Z-.5=D,
        U21.Z-=TE);
U11.4(U11.Q-.4=Q) = FD2SA(CP-=CP,U6.Z-=CD,U11.Q-.4=TI,U0.Z-.4=D,
        U21.Z-=TE);
U11.3(U11.Q-.3=Q) = FD2SA(CP-=CP,U6.Z-=CD,U11.Q-.3=TI,U0.Z-.3=D,
        U21.Z-=TE);
U11.2(U11.Q-.2=Q) = FD2SA(CP-=CP,U6.Z-=CD,U11.Q-.2=TI,U0.Z-.2=D,
        U21.Z-=TE);
U11.1(U11.Q-.1=Q) = FD2SA(CP-=CP,U6.Z-=CD,U11.Q-.1=TI,U0.Z-.1=D,
        U21.Z-=TE);
U11.0(U11.Q-.0=Q) = FD2SA(CP-=CP,U6.Z-=CD,U11.Q-.0=TI,U0.Z-.0=D,
        U21.Z-=TE);
U10.12(U10.Q-.12=Q) = FD2SA(U11.Q-.12=D,CP-=CP,U6.Z-=CD,U21.Z-=TE,
        U10.Q-.12=TI);
U10.11(U10.Q-.11=Q) = FD2SA(U11.Q-.11=D,CP-=CP,U6.Z-=CD,U21.Z-=TE,
        U10.Q-.11=TI);
U10.10(U10.Q-.10=Q) = FD2SA(U11.Q-.10=D,CP-=CP,U6.Z-=CD,U21.Z-=TE,
        U10.Q-.10=TI);
U10.9(U10.Q-.9=Q) = FD2SA(U11.Q-.9=D,CP-=CP,U6.Z-=CD,U21.Z-=TE,
        U10.Q-.9=TI);
U10.8(U10.Q-.8=Q) = FD2SA(U11.Q-.8=D,CP-=CP,U6.Z-=CD,U21.Z-=TE,
        U10.Q-.8=TI);
U10.7(U10.Q-.7=Q) = FD2SA(U11.Q-.7=D,CP-=CP,U6.Z-=CD,U21.Z-=TE,
        U10.Q-.7=TI);
U10.6(U10.Q-.6=Q) = FD2SA(U11.Q-.6=D,CP-=CP,U6.Z-=CD,U21.Z-=TE,
        U10.Q-.6=TI);
U10.5(U10.Q-.5=Q) = FD2SA(U11.Q-.5=D,CP-=CP,U6.Z-=CD,U21.Z-=TE,
        U10.Q-.5=TI);
U10.4(U10.Q-.4=Q) = FD2SA(U11.Q-.4=D,CP-=CP,U6.Z-=CD,U21.Z-=TE,
        U10.Q-.4=TI);
U10.3(U10.Q-.3=Q) = FD2SA(U11.Q-.3=D,CP-=CP,U6.Z-=CD,U21.Z-=TE,
        U10.Q-.3=TI);
U10.2(U10.Q-.2=Q) = FD2SA(U11.Q-.2=D,CP-=CP,U6.Z-=CD,U21.Z-=TE,
        U10.Q-.2=TI);
U10.1(U10.Q-.1=Q) = FD2SA(U11.Q-.1=D,CP-=CP,U6.Z-=CD,U21.Z-=TE,
        U10.Q-.1=TI);
U10.0(U10.Q-.0=Q) = FD2SA(U11.Q-.0=D,CP-=CP,U6.Z-=CD,U21.Z-=TE,
        U10.Q-.0=TI);
U5.12(Q2-.12=Q) = LD1A(U19.Z-=G,U10.Q-.12=D);
U5.11(Q2-.11=Q) = LD1A(U19.Z-=G,U10.Q-.11=D);
U5.10(Q2-.10=Q) = LD1A(U19.Z-=G,U10.Q-.10=D);
U5.9(Q2-.9=Q) = LD1A(U19.Z-=G,U10.Q-.9=D);
U5.8(Q2-.8=Q) = LD1A(U19.Z-=G,U10.Q-.8=D);
U5.7(Q2-.7=Q) = LD1A(U19.Z-=G,U10.Q-.7=D);
U5.6(Q2-.6=Q) = LD1A(U19.Z-=G,U10.Q-.6=D);
U5.5(Q2-.5=Q) = LD1A(U19.Z-=G,U10.Q-.5=D);
U5.4(Q2-.4=Q) = LD1A(U19.Z-=G,U10.Q-.4=D);
U5.3(Q2-.3=Q) = LD1A(U19.Z-=G,U10.Q-.3=D);
U5.2(Q2-.2=Q) = LD1A(U19.Z-=G,U10.Q-.2=D);
```

```
    U5.1(Q2-.1=Q) = LD1A(U19.Z-=G,U10.Q-.1=D);
    U5.0(Q2-.0=Q) = LD1A(U19.Z-=G,U10.Q-.0=D);

  /* extractors ******************************/

  /* type converters *********************/

ANNOTATIONS
{
  BUS BUS_TYPE = "DOT";
}

END MODULE;


/* * * * * * *  Contents of NET file PLREGV2.NET  * * * * * * */

/*****************************************************/
/*  Netlist copyright (C) 1989 LSI Logic Corporation  */
/*****************************************************/

MODULE PLREGV2;

INPUTS       CP,D.12,D.11,D.10,D.9,D.8,D.7,D.6,D.5,D.4,D.3,D.2,D.1,
             D.0,DLY_POL,DUP,NOS.1,NOS.0,PDI.12,PDI.11,PDI.10,
             PDI.9,PDI.8,PDI.7,PDI.6,PDI.5,PDI.4,PDI.3,PDI.2,PDI.1,
             PDI.0,PLR_CS_,RESET_,SE,SPR.1,SPR.0,TST,WAIT,WR_;
OUTPUTS      Q0.12,Q0.11,Q0.10,Q0.9,Q0.8,Q0.7,Q0.6,Q0.5,Q0.4,Q0.3,
             Q0.2,Q0.1,Q0.0,Q1.12,Q1.11,Q1.10,Q1.9,Q1.8,Q1.7,Q1.6,
             Q1.5,Q1.4,Q1.3,Q1.2,Q1.1,Q1.0,Q2.12,Q2.11,Q2.10,Q2.9,
             Q2.8,Q2.7,Q2.6,Q2.5,Q2.4,Q2.3,Q2.2,Q2.1,Q2.0,Q3.12,
             Q3.11,Q3.10,Q3.9,Q3.8,Q3.7,Q3.6,Q3.5,Q3.4,Q3.3,Q3.2,
             Q3.1,Q3.0,Q4.12,Q4.11,Q4.10,Q4.9,Q4.8,Q4.7,Q4.6,Q4.5,
             Q4.4,Q4.3,Q4.2,Q4.1,Q4.0;

LEVEL FUNCTION;
DEFINE
  /* implicit connectors *******************/

    DUP- = (DUP);
    SE- = (SE);
    D-.12 = (D.12);
    D-.11 = (D.11);
    D-.10 = (D.10);
    D-.9 = (D.9);
    D-.8 = (D.8);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    WR_- = (WR_);
    PLR_CS_- = (PLR_CS_);
    TST- = (TST);
    Q2-.12 = (Q2.12);
```

```
Q2-.11 = (Q2.11);
Q2-.10 = (Q2.10);
Q2-.9 = (Q2.9);
Q2-.8 = (Q2.8);
Q2-.7 = (Q2.7);
Q2-.6 = (Q2.6);
Q2-.5 = (Q2.5);
Q2-.4 = (Q2.4);
Q2-.3 = (Q2.3);
Q2-.2 = (Q2.2);
Q2-.1 = (Q2.1);
Q2-.0 = (Q2.0);
Q0-.12 = (Q0.12);
Q0-.11 = (Q0.11);
Q0-.10 = (Q0.10);
Q0-.9 = (Q0.9);
Q0-.8 = (Q0.8);
Q0-.7 = (Q0.7);
Q0-.6 = (Q0.6);
Q0-.5 = (Q0.5);
Q0-.4 = (Q0.4);
Q0-.3 = (Q0.3);
Q0-.2 = (Q0.2);
Q0-.1 = (Q0.1);
Q0-.0 = (Q0.0);
Q4-.12 = (Q4.12);
Q4-.11 = (Q4.11);
Q4-.10 = (Q4.10);
Q4-.9 = (Q4.9);
Q4-.8 = (Q4.8);
Q4-.7 = (Q4.7);
Q4-.6 = (Q4.6);
Q4-.5 = (Q4.5);
Q4-.4 = (Q4.4);
Q4-.3 = (Q4.3);
Q4-.2 = (Q4.2);
Q4-.1 = (Q4.1);
Q4-.0 = (Q4.0);
Q3-.12 = (Q3.12);
Q3-.11 = (Q3.11);
Q3-.10 = (Q3.10);
Q3-.9 = (Q3.9);
Q3-.8 = (Q3.8);
Q3-.7 = (Q3.7);
Q3-.6 = (Q3.6);
Q3-.5 = (Q3.5);
Q3-.4 = (Q3.4);
Q3-.3 = (Q3.3);
Q3-.2 = (Q3.2);
Q3-.1 = (Q3.1);
Q3-.0 = (Q3.0);
Q1-.12 = (Q1.12);
Q1-.11 = (Q1.11);
Q1-.10 = (Q1.10);
Q1-.9 = (Q1.9);
Q1-.8 = (Q1.8);
Q1-.7 = (Q1.7);
Q1-.6 = (Q1.6);
Q1-.5 = (Q1.5);
Q1-.4 = (Q1.4);
Q1-.3 = (Q1.3);
Q1-.2 = (Q1.2);
Q1-.1 = (Q1.1);
Q1-.0 = (Q1.0);
SPR-.1 = (SPR.1);
SPR-.0 = (SPR.0);
DSPR-.1 = (DSPR.1);
DSPR-.0 = (DSPR.0);
DSPR-.1 = (DSPR.1);
DSPR-.0 = (DSPR.0);
DSPR-.1 = (DSPR.1);
DSPR-.0 = (DSPR.0);
NOS-.1 = (NOS.1);
NOS-.0 = (NOS.0);
DLY_POL- = (DLY_POL);
WAIT- = (WAIT);
```

```
CP- = (CP);
CP- = (CP);
CP- = (CP);
RESET_- = (RESET_);
RESET_- = (RESET_);
RESET_- = (RESET_);
WAIT- = (WAIT);


/* part instances ***************************/

U0.12(Q4-.12=Z) = MUX41C(U7.Z-=A,U6.Z-=B,U0.D3-.12=D3,U0.D2-.12=D2,
        U0.D1-.12=D1,U0.D0-.12=D0);
U0.11(Q4-.11=Z) = MUX41C(U7.Z-=A,U6.Z-=B,U0.D3-.11=D3,U0.D2-.11=D2,
        U0.D1-.11=D1,U0.D0-.11=D0);
U0.10(Q4-.10=Z) = MUX41C(U7.Z-=A,U6.Z-=B,U0.D3-.10=D3,U0.D2-.10=D2,
        U0.D1-.10=D1,U0.D0-.10=D0);
U0.9(Q4-.9=Z) = MUX41C(U7.Z-=A,U6.Z-=B,U0.D3-.9=D3,U0.D2-.9=D2,
        U0.D1-.9=D1,U0.D0-.9=D0);
U0.8(Q4-.8=Z) = MUX41C(U7.Z-=A,U6.Z-=B,U0.D3-.8=D3,U0.D2-.8=D2,
        U0.D1-.8=D1,U0.D0-.8=D0);
U0.7(Q4-.7=Z) = MUX41C(U7.Z-=A,U6.Z-=B,U0.D3-.7=D3,U0.D2-.7=D2,
        U0.D1-.7=D1,U0.D0-.7=D0);
U0.6(Q4-.6=Z) = MUX41C(U7.Z-=A,U6.Z-=B,U0.D3-.6=D3,U0.D2-.6=D2,
        U0.D1-.6=D1,U0.D0-.6=D0);
U0.5(Q4-.5=Z) = MUX41C(U7.Z-=A,U6.Z-=B,U0.D3-.5=D3,U0.D2-.5=D2,
        U0.D1-.5=D1,U0.D0-.5=D0);
U0.4(Q4-.4=Z) = MUX41C(U7.Z-=A,U6.Z-=B,U0.D3-.4=D3,U0.D2-.4=D2,
        U0.D1-.4=D1,U0.D0-.4=D0);
U0.3(Q4-.3=Z) = MUX41C(U7.Z-=A,U6.Z-=B,U0.D3-.3=D3,U0.D2-.3=D2,
        U0.D1-.3=D1,U0.D0-.3=D0);
U0.2(Q4-.2=Z) = MUX41C(U7.Z-=A,U6.Z-=B,U0.D3-.2=D3,U0.D2-.2=D2,
        U0.D1-.2=D1,U0.D0-.2=D0);
U0.1(Q4-.1=Z) = MUX41C(U7.Z-=A,U6.Z-=B,U0.D3-.1=D3,U0.D2-.1=D2,
        U0.D1-.1=D1,U0.D0-.1=D0);
U0.0(Q4-.0=Z) = MUX41C(U7.Z-=A,U6.Z-=B,U0.D3-.0=D3,U0.D2-.0=D2,
        U0.D1-.0=D1,U0.D0-.0=D0);
U2.12(Q3-.12=Z) = MUX41C(U7.Z-=A,U6.Z-=B,U2.D3-.12=D3,U2.D2-.12=D2,
        U2.D1-.12=D1,U2.D0-.12=D0);
U2.11(Q3-.11=Z) = MUX41C(U7.Z-=A,U6.Z-=B,U2.D3-.11=D3,U2.D2-.11=D2,
        U2.D1-.11=D1,U2.D0-.11=D0);
U2.10(Q3-.10=Z) = MUX41C(U7.Z-=A,U6.Z-=B,U2.D3-.10=D3,U2.D2-.10=D2,
        U2.D1-.10=D1,U2.D0-.10=D0);
U2.9(Q3-.9=Z) = MUX41C(U7.Z-=A,U6.Z-=B,U2.D3-.9=D3,U2.D2-.9=D2,
        U2.D1-.9=D1,U2.D0-.9=D0);
U2.8(Q3-.8=Z) = MUX41C(U7.Z-=A,U6.Z-=B,U2.D3-.8=D3,U2.D2-.8=D2,
        U2.D1-.8=D1,U2.D0-.8=D0);
U2.7(Q3-.7=Z) = MUX41C(U7.Z-=A,U6.Z-=B,U2.D3-.7=D3,U2.D2-.7=D2,
        U2.D1-.7=D1,U2.D0-.7=D0);
U2.6(Q3-.6=Z) = MUX41C(U7.Z-=A,U6.Z-=B,U2.D3-.6=D3,U2.D2-.6=D2,
        U2.D1-.6=D1,U2.D0-.6=D0);
U2.5(Q3-.5=Z) = MUX41C(U7.Z-=A,U6.Z-=B,U2.D3-.5=D3,U2.D2-.5=D2,
        U2.D1-.5=D1,U2.D0-.5=D0);
U2.4(Q3-.4=Z) = MUX41C(U7.Z-=A,U6.Z-=B,U2.D3-.4=D3,U2.D2-.4=D2,
        U2.D1-.4=D1,U2.D0-.4=D0);
U2.3(Q3-.3=Z) = MUX41C(U7.Z-=A,U6.Z-=B,U2.D3-.3=D3,U2.D2-.3=D2,
        U2.D1-.3=D1,U2.D0-.3=D0);
U2.2(Q3-.2=Z) = MUX41C(U7.Z-=A,U6.Z-=B,U2.D3-.2=D3,U2.D2-.2=D2,
        U2.D1-.2=D1,U2.D0-.2=D0);
U2.1(Q3-.1=Z) = MUX41C(U7.Z-=A,U6.Z-=B,U2.D3-.1=D3,U2.D2-.1=D2,
        U2.D1-.1=D1,U2.D0-.1=D0);
U2.0(Q3-.0=Z) = MUX41C(U7.Z-=A,U6.Z-=B,U2.D3-.0=D3,U2.D2-.0=D2,
        U2.D1-.0=D1,U2.D0-.0=D0);
U4.12(Q1-.12=Z) = MUX41C(U7.Z-=A,U6.Z-=B,U4.D3-.12=D3,U4.D2-.12=D2,
        U4.D1-.12=D1,U4.D0-.12=D0);
U4.11(Q1-.11=Z) = MUX41C(U7.Z-=A,U6.Z-=B,U4.D3-.11=D3,U4.D2-.11=D2,
        U4.D1-.11=D1,U4.D0-.11=D0);
U4.10(Q1-.10=Z) = MUX41C(U7.Z-=A,U6.Z-=B,U4.D3-.10=D3,U4.D2-.10=D2,
        U4.D1-.10=D1,U4.D0-.10=D0);
U4.9(Q1-.9=Z) = MUX41C(U7.Z-=A,U6.Z-=B,U4.D3-.9=D3,U4.D2-.9=D2,
        U4.D1-.9=D1,U4.D0-.9=D0);
U4.8(Q1-.8=Z) = MUX41C(U7.Z-=A,U6.Z-=B,U4.D3-.8=D3,U4.D2-.8=D2,
        U4.D1-.8=D1,U4.D0-.8=D0);
U4.7(Q1-.7=Z) = MUX41C(U7.Z-=A,U6.Z-=B,U4.D3-.7=D3,U4.D2-.7=D2,
        U4.D1-.7=D1,U4.D0-.7=D0);
```

```
U4.6(Q1-.6=Z) = MUX41C(U7.Z-=A,U6.Z-=B,U4.D3-.6=D3,U4.D2-.6=D2,
        U4.D1-.6=D1,U4.D0-.6=D0);
U4.5(Q1-.5=Z) = MUX41C(U7.Z-=A,U6.Z-=B,U4.D3-.5=D3,U4.D2-.5=D2,
        U4.D1-.5=D1,U4.D0-.5=D0);
U4.4(Q1-.4=Z) = MUX41C(U7.Z-=A,U6.Z-=B,U4.D3-.4=D3,U4.D2-.4=D2,
        U4.D1-.4=D1,U4.D0-.4=D0);
U4.3(Q1-.3=Z) = MUX41C(U7.Z-=A,U6.Z-=B,U4.D3-.3=D3,U4.D2-.3=D2,
        U4.D1-.3=D1,U4.D0-.3=D0);
U4.2(Q1-.2=Z) = MUX41C(U7.Z-=A,U6.Z-=B,U4.D3-.2=D3,U4.D2-.2=D2,
        U4.D1-.2=D1,U4.D0-.2=D0);
U4.1(Q1-.1=Z) = MUX41C(U7.Z-=A,U6.Z-=B,U4.D3-.1=D3,U4.D2-.1=D2,
        U4.D1-.1=D1,U4.D0-.1=D0);
U4.0(Q1-.0=Z) = MUX41C(U7.Z-=A,U6.Z-=B,U4.D3-.0=D3,U4.D2-.0=D2,
        U4.D1-.0=D1,U4.D0-.0=D0);
U13(U13.Z-.3=Z.3,U13.Z-.2=Z.2,U13.Z-.1=Z.1,U13.Z-.0=Z.0) =
        DEC24(DSPR-.1=SEL.1,DSPR-.0=SEL.0);
U14.1(DSPR-.1=QD) = SRDLY(SPR-.1=D,NOS-.1=NOS.1,NOS-.0=NOS.0,
        DLY_POL-=DLY_POL,WAIT-=WAIT,CP-=CP,RESET_-=RESET_);
U14.0(DSPR-.0=QD) = SRDLY(SPR-.0=D,NOS-.1=NOS.1,NOS-.0=NOS.0,
        DLY_POL-=DLY_POL,WAIT-=WAIT,CP-=CP,RESET_-=RESET_);
U15.1(U15.Q-.1=Q) = FD2A(CP-=CP,DSPR-.1=D,RESET_-=CD);
U15.0(U15.Q-.0=Q) = FD2A(CP-=CP,DSPR-.0=D,RESET_-=CD);
U6(U6.Z-=Z) = B3A(U6.A-=A);
U7(U7.Z-=Z) = B3A(U7.A-=A);
U5.12(Q0-.12=Z) = MUX41C(U7.Z-=A,U6.Z-=B,U5.D3-.12=D3,U5.D2-.12=D2,
        U5.D1-.12=D1,U5.D0-.12=D0);
U5.11(Q0-.11=Z) = MUX41C(U7.Z-=A,U6.Z-=B,U5.D3-.11=D3,U5.D2-.11=D2,
        U5.D1-.11=D1,U5.D0-.11=D0);
U5.10(Q0-.10=Z) = MUX41C(U7.Z-=A,U6.Z-=B,U5.D3-.10=D3,U5.D2-.10=D2,
        U5.D1-.10=D1,U5.D0-.10=D0);
U5.9(Q0-.9=Z) = MUX41C(U7.Z-=A,U6.Z-=B,U5.D3-.9=D3,U5.D2-.9=D2,
        U5.D1-.9=D1,U5.D0-.9=D0);
U5.8(Q0-.8=Z) = MUX41C(U7.Z-=A,U6.Z-=B,U5.D3-.8=D3,U5.D2-.8=D2,
        U5.D1-.8=D1,U5.D0-.8=D0);
U5.7(Q0-.7=Z) = MUX41C(U7.Z-=A,U6.Z-=B,U5.D3-.7=D3,U5.D2-.7=D2,
        U5.D1-.7=D1,U5.D0-.7=D0);
U5.6(Q0-.6=Z) = MUX41C(U7.Z-=A,U6.Z-=B,U5.D3-.6=D3,U5.D2-.6=D2,
        U5.D1-.6=D1,U5.D0-.6=D0);
U5.5(Q0-.5=Z) = MUX41C(U7.Z-=A,U6.Z-=B,U5.D3-.5=D3,U5.D2-.5=D2,
        U5.D1-.5=D1,U5.D0-.5=D0);
U5.4(Q0-.4=Z) = MUX41C(U7.Z-=A,U6.Z-=B,U5.D3-.4=D3,U5.D2-.4=D2,
        U5.D1-.4=D1,U5.D0-.4=D0);
U5.3(Q0-.3=Z) = MUX41C(U7.Z-=A,U6.Z-=B,U5.D3-.3=D3,U5.D2-.3=D2,
        U5.D1-.3=D1,U5.D0-.3=D0);
U5.2(Q0-.2=Z) = MUX41C(U7.Z-=A,U6.Z-=B,U5.D3-.2=D3,U5.D2-.2=D2,
        U5.D1-.2=D1,U5.D0-.2=D0);
U5.1(Q0-.1=Z) = MUX41C(U7.Z-=A,U6.Z-=B,U5.D3-.1=D3,U5.D2-.1=D2,
        U5.D1-.1=D1,U5.D0-.1=D0);
U5.0(Q0-.0=Z) = MUX41C(U7.Z-=A,U6.Z-=B,U5.D3-.0=D3,U5.D2-.0=D2,
        U5.D1-.0=D1,U5.D0-.0=D0);
U3.12(Q2-.12=Z) = MUX41C(U7.Z-=A,U6.Z-=B,U3.D0-.12=D0,U3.D1-.12=D1,
        U3.D2-.12=D2,U3.D3-.12=D3);
U3.11(Q2-.11=Z) = MUX41C(U7.Z-=A,U6.Z-=B,U3.D0-.11=D0,U3.D1-.11=D1,
        U3.D2-.11=D2,U3.D3-.11=D3);
U3.10(Q2-.10=Z) = MUX41C(U7.Z-=A,U6.Z-=B,U3.D0-.10=D0,U3.D1-.10=D1,
        U3.D2-.10=D2,U3.D3-.10=D3);
U3.9(Q2-.9=Z) = MUX41C(U7.Z-=A,U6.Z-=B,U3.D0-.9=D0,U3.D1-.9=D1,
        U3.D2-.9=D2,U3.D3-.9=D3);
U3.8(Q2-.8=Z) = MUX41C(U7.Z-=A,U6.Z-=B,U3.D0-.8=D0,U3.D1-.8=D1,
        U3.D2-.8=D2,U3.D3-.8=D3);
U3.7(Q2-.7=Z) = MUX41C(U7.Z-=A,U6.Z-=B,U3.D0-.7=D0,U3.D1-.7=D1,
        U3.D2-.7=D2,U3.D3-.7=D3);
U3.6(Q2-.6=Z) = MUX41C(U7.Z-=A,U6.Z-=B,U3.D0-.6=D0,U3.D1-.6=D1,
        U3.D2-.6=D2,U3.D3-.6=D3);
U3.5(Q2-.5=Z) = MUX41C(U7.Z-=A,U6.Z-=B,U3.D0-.5=D0,U3.D1-.5=D1,
        U3.D2-.5=D2,U3.D3-.5=D3);
U3.4(Q2-.4=Z) = MUX41C(U7.Z-=A,U6.Z-=B,U3.D0-.4=D0,U3.D1-.4=D1,
        U3.D2-.4=D2,U3.D3-.4=D3);
U3.3(Q2-.3=Z) = MUX41C(U7.Z-=A,U6.Z-=B,U3.D0-.3=D0,U3.D1-.3=D1,
        U3.D2-.3=D2,U3.D3-.3=D3);
U3.2(Q2-.2=Z) = MUX41C(U7.Z-=A,U6.Z-=B,U3.D0-.2=D0,U3.D1-.2=D1,
        U3.D2-.2=D2,U3.D3-.2=D3);
U3.1(Q2-.1=Z) = MUX41C(U7.Z-=A,U6.Z-=B,U3.D0-.1=D0,U3.D1-.1=D1,
        U3.D2-.1=D2,U3.D3-.1=D3);
U3.0(Q2-.0=Z) = MUX41C(U7.Z-=A,U6.Z-=B,U3.D0-.0=D0,U3.D1-.0=D1,
        U3.D2-.0=D2,U3.D3-.0=D3);
```

```
U1.3(U1.Q0-.3.12=Q0.12,U1.Q0-.3.11=Q0.11,U1.Q0-.3.10=Q0.10,
        U1.Q0-.3.9=Q0.9,U1.Q0-.3.8=Q0.8,U1.Q0-.3.7=Q0.7,
        U1.Q0-.3.6=Q0.6,U1.Q0-.3.5=Q0.5,U1.Q0-.3.4=Q0.4,
        U1.Q0-.3.3=Q0.3,U1.Q0-.3.2=Q0.2,U1.Q0-.3.1=Q0.1,
        U1.Q0-.3.0=Q0.0,U1.Q4-.3.12=Q4.12,U1.Q4-.3.11=Q4.11,
        U1.Q4-.3.10=Q4.10,U1.Q4-.3.9=Q4.9,U1.Q4-.3.8=Q4.8,
        U1.Q4-.3.7=Q4.7,U1.Q4-.3.6=Q4.6,U1.Q4-.3.5=Q4.5,
        U1.Q4-.3.4=Q4.4,U1.Q4-.3.3=Q4.3,U1.Q4-.3.2=Q4.2,
        U1.Q4-.3.1=Q4.1,U1.Q4-.3.0=Q4.0,U1.Q1-.3.12=Q1.12,
        U1.Q1-.3.11=Q1.11,U1.Q1-.3.10=Q1.10,U1.Q1-.3.9=Q1.9,
        U1.Q1-.3.8=Q1.8,U1.Q1-.3.7=Q1.7,U1.Q1-.3.6=Q1.6,
        U1.Q1-.3.5=Q1.5,U1.Q1-.3.4=Q1.4,U1.Q1-.3.3=Q1.3,
        U1.Q1-.3.2=Q1.2,U1.Q1-.3.1=Q1.1,U1.Q1-.3.0=Q1.0,
        U1.Q3-.3.12=Q3.12,U1.Q3-.3.11=Q3.11,U1.Q3-.3.10=Q3.10,
        U1.Q3-.3.9=Q3.9,U1.Q3-.3.8=Q3.8,U1.Q3-.3.7=Q3.7,
        U1.Q3-.3.6=Q3.6,U1.Q3-.3.5=Q3.5,U1.Q3-.3.4=Q3.4,
        U1.Q3-.3.3=Q3.3,U1.Q3-.3.2=Q3.2,U1.Q3-.3.1=Q3.1,
        U1.Q3-.3.0=Q3.0,U1.Q2-.3.12=Q2.12,U1.Q2-.3.11=Q2.11,
        U1.Q2-.3.10=Q2.10,U1.Q2-.3.9=Q2.9,U1.Q2-.3.8=Q2.8,
        U1.Q2-.3.7=Q2.7,U1.Q2-.3.6=Q2.6,U1.Q2-.3.5=Q2.5,
        U1.Q2-.3.4=Q2.4,U1.Q2-.3.3=Q2.3,U1.Q2-.3.2=Q2.2,
        U1.Q2-.3.1=Q2.1,U1.Q2-.3.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.3=ASPR);
U1.2(U1.Q0-.2.12=Q0.12,U1.Q0-.2.11=Q0.11,U1.Q0-.2.10=Q0.10,
        U1.Q0-.2.9=Q0.9,U1.Q0-.2.8=Q0.8,U1.Q0-.2.7=Q0.7,
        U1.Q0-.2.6=Q0.6,U1.Q0-.2.5=Q0.5,U1.Q0-.2.4=Q0.4,
        U1.Q0-.2.3=Q0.3,U1.Q0-.2.2=Q0.2,U1.Q0-.2.1=Q0.1,
        U1.Q0-.2.0=Q0.0,U1.Q4-.2.12=Q4.12,U1.Q4-.2.11=Q4.11,
        U1.Q4-.2.10=Q4.10,U1.Q4-.2.9=Q4.9,U1.Q4-.2.8=Q4.8,
        U1.Q4-.2.7=Q4.7,U1.Q4-.2.6=Q4.6,U1.Q4-.2.5=Q4.5,
        U1.Q4-.2.4=Q4.4,U1.Q4-.2.3=Q4.3,U1.Q4-.2.2=Q4.2,
        U1.Q4-.2.1=Q4.1,U1.Q4-.2.0=Q4.0,U1.Q1-.2.12=Q1.12,
        U1.Q1-.2.11=Q1.11,U1.Q1-.2.10=Q1.10,U1.Q1-.2.9=Q1.9,
        U1.Q1-.2.8=Q1.8,U1.Q1-.2.7=Q1.7,U1.Q1-.2.6=Q1.6,
        U1.Q1-.2.5=Q1.5,U1.Q1-.2.4=Q1.4,U1.Q1-.2.3=Q1.3,
        U1.Q1-.2.2=Q1.2,U1.Q1-.2.1=Q1.1,U1.Q1-.2.0=Q1.0,
        U1.Q3-.2.12=Q3.12,U1.Q3-.2.11=Q3.11,U1.Q3-.2.10=Q3.10,
        U1.Q3-.2.9=Q3.9,U1.Q3-.2.8=Q3.8,U1.Q3-.2.7=Q3.7,
        U1.Q3-.2.6=Q3.6,U1.Q3-.2.5=Q3.5,U1.Q3-.2.4=Q3.4,
        U1.Q3-.2.3=Q3.3,U1.Q3-.2.2=Q3.2,U1.Q3-.2.1=Q3.1,
        U1.Q3-.2.0=Q3.0,U1.Q2-.2.12=Q2.12,U1.Q2-.2.11=Q2.11,
        U1.Q2-.2.10=Q2.10,U1.Q2-.2.9=Q2.9,U1.Q2-.2.8=Q2.8,
        U1.Q2-.2.7=Q2.7,U1.Q2-.2.6=Q2.6,U1.Q2-.2.5=Q2.5,
        U1.Q2-.2.4=Q2.4,U1.Q2-.2.3=Q2.3,U1.Q2-.2.2=Q2.2,
        U1.Q2-.2.1=Q2.1,U1.Q2-.2.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.2=ASPR);
U1.1(U1.Q0-.1.12=Q0.12,U1.Q0-.1.11=Q0.11,U1.Q0-.1.10=Q0.10,
        U1.Q0-.1.9=Q0.9,U1.Q0-.1.8=Q0.8,U1.Q0-.1.7=Q0.7,
        U1.Q0-.1.6=Q0.6,U1.Q0-.1.5=Q0.5,U1.Q0-.1.4=Q0.4,
        U1.Q0-.1.3=Q0.3,U1.Q0-.1.2=Q0.2,U1.Q0-.1.1=Q0.1,
        U1.Q0-.1.0=Q0.0,U1.Q4-.1.12=Q4.12,U1.Q4-.1.11=Q4.11,
        U1.Q4-.1.10=Q4.10,U1.Q4-.1.9=Q4.9,U1.Q4-.1.8=Q4.8,
        U1.Q4-.1.7=Q4.7,U1.Q4-.1.6=Q4.6,U1.Q4-.1.5=Q4.5,
        U1.Q4-.1.4=Q4.4,U1.Q4-.1.3=Q4.3,U1.Q4-.1.2=Q4.2,
        U1.Q4-.1.1=Q4.1,U1.Q4-.1.0=Q4.0,U1.Q1-.1.12=Q1.12,
        U1.Q1-.1.11=Q1.11,U1.Q1-.1.10=Q1.10,U1.Q1-.1.9=Q1.9,
        U1.Q1-.1.8=Q1.8,U1.Q1-.1.7=Q1.7,U1.Q1-.1.6=Q1.6,
        U1.Q1-.1.5=Q1.5,U1.Q1-.1.4=Q1.4,U1.Q1-.1.3=Q1.3,
        U1.Q1-.1.2=Q1.2,U1.Q1-.1.1=Q1.1,U1.Q1-.1.0=Q1.0,
        U1.Q3-.1.12=Q3.12,U1.Q3-.1.11=Q3.11,U1.Q3-.1.10=Q3.10,
        U1.Q3-.1.9=Q3.9,U1.Q3-.1.8=Q3.8,U1.Q3-.1.7=Q3.7,
        U1.Q3-.1.6=Q3.6,U1.Q3-.1.5=Q3.5,U1.Q3-.1.4=Q3.4,
        U1.Q3-.1.3=Q3.3,U1.Q3-.1.2=Q3.2,U1.Q3-.1.1=Q3.1,
        U1.Q3-.1.0=Q3.0,U1.Q2-.1.12=Q2.12,U1.Q2-.1.11=Q2.11,
```

```
        U1.Q2-.1.10=Q2.10,U1.Q2-.1.9=Q2.9,U1.Q2-.1.8=Q2.8,
        U1.Q2-.1.7=Q2.7,U1.Q2-.1.6=Q2.6,U1.Q2-.1.5=Q2.5,
        U1.Q2-.1.4=Q2.4,U1.Q2-.1.3=Q2.3,U1.Q2-.1.2=Q2.2,
        U1.Q2-.1.1=Q2.1,U1.Q2-.1.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.1=ASPR);
U1.0(U1.Q0-.0.12=Q0.12,U1.Q0-.0.11=Q0.11,U1.Q0-.0.10=Q0.10,
        U1.Q0-.0.9=Q0.9,U1.Q0-.0.8=Q0.8,U1.Q0-.0.7=Q0.7,
        U1.Q0-.0.6=Q0.6,U1.Q0-.0.5=Q0.5,U1.Q0-.0.4=Q0.4,
        U1.Q0-.0.3=Q0.3,U1.Q0-.0.2=Q0.2,U1.Q0-.0.1=Q0.1,
        U1.Q0-.0.0=Q0.0,U1.Q4-.0.12=Q4.12,U1.Q4-.0.11=Q4.11,
        U1.Q4-.0.10=Q4.10,U1.Q4-.0.9=Q4.9,U1.Q4-.0.8=Q4.8,
        U1.Q4-.0.7=Q4.7,U1.Q4-.0.6=Q4.6,U1.Q4-.0.5=Q4.5,
        U1.Q4-.0.4=Q4.4,U1.Q4-.0.3=Q4.3,U1.Q4-.0.2=Q4.2,
        U1.Q4-.0.1=Q4.1,U1.Q4-.0.0=Q4.0,U1.Q1-.0.12=Q1.12,
        U1.Q1-.0.11=Q1.11,U1.Q1-.0.10=Q1.10,U1.Q1-.0.9=Q1.9,
        U1.Q1-.0.8=Q1.8,U1.Q1-.0.7=Q1.7,U1.Q1-.0.6=Q1.6,
        U1.Q1-.0.5=Q1.5,U1.Q1-.0.4=Q1.4,U1.Q1-.0.3=Q1.3,
        U1.Q1-.0.2=Q1.2,U1.Q1-.0.1=Q1.1,U1.Q1-.0.0=Q1.0,
        U1.Q3-.0.12=Q3.12,U1.Q3-.0.11=Q3.11,U1.Q3-.0.10=Q3.10,
        U1.Q3-.0.9=Q3.9,U1.Q3-.0.8=Q3.8,U1.Q3-.0.7=Q3.7,
        U1.Q3-.0.6=Q3.6,U1.Q3-.0.5=Q3.5,U1.Q3-.0.4=Q3.4,
        U1.Q3-.0.3=Q3.3,U1.Q3-.0.2=Q3.2,U1.Q3-.0.1=Q3.1,
        U1.Q3-.0.0=Q3.0,U1.Q2-.0.12=Q2.12,U1.Q2-.0.11=Q2.11,
        U1.Q2-.0.10=Q2.10,U1.Q2-.0.9=Q2.9,U1.Q2-.0.8=Q2.8,
        U1.Q2-.0.7=Q2.7,U1.Q2-.0.6=Q2.6,U1.Q2-.0.5=Q2.5,
        U1.Q2-.0.4=Q2.4,U1.Q2-.0.3=Q2.3,U1.Q2-.0.2=Q2.2,
        U1.Q2-.0.1=Q2.1,U1.Q2-.0.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.0=ASPR);

/* extractors ******************************/

   U1.Q4-.2.12 = (U0.D2-.12);
   U1.Q4-.2.11 = (U0.D2-.11);
   U1.Q4-.2.10 = (U0.D2-.10);
   U1.Q4-.2.9 = (U0.D2-.9);
   U1.Q4-.2.8 = (U0.D2-.8);
   U1.Q4-.2.7 = (U0.D2-.7);
   U1.Q4-.2.6 = (U0.D2-.6);
   U1.Q4-.2.5 = (U0.D2-.5);
   U1.Q4-.2.4 = (U0.D2-.4);
   U1.Q4-.2.3 = (U0.D2-.3);
   U1.Q4-.2.2 = (U0.D2-.2);
   U1.Q4-.2.1 = (U0.D2-.1);
   U1.Q4-.2.0 = (U0.D2-.0);
   U1.Q4-.3.12 = (U0.D3-.12);
   U1.Q4-.3.11 = (U0.D3-.11);
   U1.Q4-.3.10 = (U0.D3-.10);
   U1.Q4-.3.9 = (U0.D3-.9);
   U1.Q4-.3.8 = (U0.D3-.8);
   U1.Q4-.3.7 = (U0.D3-.7);
   U1.Q4-.3.6 = (U0.D3-.6);
   U1.Q4-.3.5 = (U0.D3-.5);
   U1.Q4-.3.4 = (U0.D3-.4);
   U1.Q4-.3.3 = (U0.D3-.3);
   U1.Q4-.3.2 = (U0.D3-.2);
   U1.Q4-.3.1 = (U0.D3-.1);
   U1.Q4-.3.0 = (U0.D3-.0);
   U1.Q4-.1.12 = (U0.D1-.12);
   U1.Q4-.1.11 = (U0.D1-.11);
   U1.Q4-.1.10 = (U0.D1-.10);
   U1.Q4-.1.9 = (U0.D1-.9);
   U1.Q4-.1.8 = (U0.D1-.8);
   U1.Q4-.1.7 = (U0.D1-.7);
   U1.Q4-.1.6 = (U0.D1-.6);
```

```
U1.Q4-.1.5 = (U0.D1-.5);
U1.Q4-.1.4 = (U0.D1-.4);
U1.Q4-.1.3 = (U0.D1-.3);
U1.Q4-.1.2 = (U0.D1-.2);
U1.Q4-.1.1 = (U0.D1-.1);
U1.Q4-.1.0 = (U0.D1-.0);
U1.Q4-.0.12 = (U0.D0-.12);
U1.Q4-.0.11 = (U0.D0-.11);
U1.Q4-.0.10 = (U0.D0-.10);
U1.Q4-.0.9 = (U0.D0-.9);
U1.Q4-.0.8 = (U0.D0-.8);
U1.Q4-.0.7 = (U0.D0-.7);
U1.Q4-.0.6 = (U0.D0-.6);
U1.Q4-.0.5 = (U0.D0-.5);
U1.Q4-.0.4 = (U0.D0-.4);
U1.Q4-.0.3 = (U0.D0-.3);
U1.Q4-.0.2 = (U0.D0-.2);
U1.Q4-.0.1 = (U0.D0-.1);
U1.Q4-.0.0 = (U0.D0-.0);
U1.Q3-.2.12 = (U2.D2-.12);
U1.Q3-.2.11 = (U2.D2-.11);
U1.Q3-.2.10 = (U2.D2-.10);
U1.Q3-.2.9 = (U2.D2-.9);
U1.Q3-.2.8 = (U2.D2-.8);
U1.Q3-.2.7 = (U2.D2-.7);
U1.Q3-.2.6 = (U2.D2-.6);
U1.Q3-.2.5 = (U2.D2-.5);
U1.Q3-.2.4 = (U2.D2-.4);
U1.Q3-.2.3 = (U2.D2-.3);
U1.Q3-.2.2 = (U2.D2-.2);
U1.Q3-.2.1 = (U2.D2-.1);
U1.Q3-.2.0 = (U2.D2-.0);
U1.Q3-.1.12 = (U2.D1-.12);
U1.Q3-.1.11 = (U2.D1-.11);
U1.Q3-.1.10 = (U2.D1-.10);
U1.Q3-.1.9 = (U2.D1-.9);
U1.Q3-.1.8 = (U2.D1-.8);
U1.Q3-.1.7 = (U2.D1-.7);
U1.Q3-.1.6 = (U2.D1-.6);
U1.Q3-.1.5 = (U2.D1-.5);
U1.Q3-.1.4 = (U2.D1-.4);
U1.Q3-.1.3 = (U2.D1-.3);
U1.Q3-.1.2 = (U2.D1-.2);
U1.Q3-.1.1 = (U2.D1-.1);
U1.Q3-.1.0 = (U2.D1-.0);
U1.Q3-.3.12 = (U2.D3-.12);
U1.Q3-.3.11 = (U2.D3-.11);
U1.Q3-.3.10 = (U2.D3-.10);
U1.Q3-.3.9 = (U2.D3-.9);
U1.Q3-.3.8 = (U2.D3-.8);
U1.Q3-.3.7 = (U2.D3-.7);
U1.Q3-.3.6 = (U2.D3-.6);
U1.Q3-.3.5 = (U2.D3-.5);
U1.Q3-.3.4 = (U2.D3-.4);
U1.Q3-.3.3 = (U2.D3-.3);
U1.Q3-.3.2 = (U2.D3-.2);
U1.Q3-.3.1 = (U2.D3-.1);
U1.Q3-.3.0 = (U2.D3-.0);
U1.Q3-.0.12 = (U2.D0-.12);
U1.Q3-.0.11 = (U2.D0-.11);
U1.Q3-.0.10 = (U2.D0-.10);
U1.Q3-.0.9 = (U2.D0-.9);
U1.Q3-.0.8 = (U2.D0-.8);
U1.Q3-.0.7 = (U2.D0-.7);
U1.Q3-.0.6 = (U2.D0-.6);
U1.Q3-.0.5 = (U2.D0-.5);
U1.Q3-.0.4 = (U2.D0-.4);
U1.Q3-.0.3 = (U2.D0-.3);
U1.Q3-.0.2 = (U2.D0-.2);
U1.Q3-.0.1 = (U2.D0-.1);
U1.Q3-.0.0 = (U2.D0-.0);
U1.Q1-.1.12 = (U4.D1-.12);
U1.Q1-.1.11 = (U4.D1-.11);
U1.Q1-.1.10 = (U4.D1-.10);
U1.Q1-.1.9 = (U4.D1-.9);
U1.Q1-.1.8 = (U4.D1-.8);
```

```
U1.Q1-.1.7 = (U4.D1-.7);
U1.Q1-.1.6 = (U4.D1-.6);
U1.Q1-.1.5 = (U4.D1-.5);
U1.Q1-.1.4 = (U4.D1-.4);
U1.Q1-.1.3 = (U4.D1-.3);
U1.Q1-.1.2 = (U4.D1-.2);
U1.Q1-.1.1 = (U4.D1-.1);
U1.Q1-.1.0 = (U4.D1-.0);
U1.Q1-.3.12 = (U4.D3-.12);
U1.Q1-.3.11 = (U4.D3-.11);
U1.Q1-.3.10 = (U4.D3-.10);
U1.Q1-.3.9 = (U4.D3-.9);
U1.Q1-.3.8 = (U4.D3-.8);
U1.Q1-.3.7 = (U4.D3-.7);
U1.Q1-.3.6 = (U4.D3-.6);
U1.Q1-.3.5 = (U4.D3-.5);
U1.Q1-.3.4 = (U4.D3-.4);
U1.Q1-.3.3 = (U4.D3-.3);
U1.Q1-.3.2 = (U4.D3-.2);
U1.Q1-.3.1 = (U4.D3-.1);
U1.Q1-.3.0 = (U4.D3-.0);
U1.Q1-.2.12 = (U4.D2-.12);
U1.Q1-.2.11 = (U4.D2-.11);
U1.Q1-.2.10 = (U4.D2-.10);
U1.Q1-.2.9 = (U4.D2-.9);
U1.Q1-.2.8 = (U4.D2-.8);
U1.Q1-.2.7 = (U4.D2-.7);
U1.Q1-.2.6 = (U4.D2-.6);
U1.Q1-.2.5 = (U4.D2-.5);
U1.Q1-.2.4 = (U4.D2-.4);
U1.Q1-.2.3 = (U4.D2-.3);
U1.Q1-.2.2 = (U4.D2-.2);
U1.Q1-.2.1 = (U4.D2-.1);
U1.Q1-.2.0 = (U4.D2-.0);
U1.Q1-.0.12 = (U4.D0-.12);
U1.Q1-.0.11 = (U4.D0-.11);
U1.Q1-.0.10 = (U4.D0-.10);
U1.Q1-.0.9 = (U4.D0-.9);
U1.Q1-.0.8 = (U4.D0-.8);
U1.Q1-.0.7 = (U4.D0-.7);
U1.Q1-.0.6 = (U4.D0-.6);
U1.Q1-.0.5 = (U4.D0-.5);
U1.Q1-.0.4 = (U4.D0-.4);
U1.Q1-.0.3 = (U4.D0-.3);
U1.Q1-.0.2 = (U4.D0-.2);
U1.Q1-.0.1 = (U4.D0-.1);
U1.Q1-.0.0 = (U4.D0-.0);
U15.Q-.1 = (U6.A-);
U15.Q-.0 = (U7.A-);
U1.Q0-.1.12 = (U5.D1-.12);
U1.Q0-.1.11 = (U5.D1-.11);
U1.Q0-.1.10 = (U5.D1-.10);
U1.Q0-.1.9 = (U5.D1-.9);
U1.Q0-.1.8 = (U5.D1-.8);
U1.Q0-.1.7 = (U5.D1-.7);
U1.Q0-.1.6 = (U5.D1-.6);
U1.Q0-.1.5 = (U5.D1-.5);
U1.Q0-.1.4 = (U5.D1-.4);
U1.Q0-.1.3 = (U5.D1-.3);
U1.Q0-.1.2 = (U5.D1-.2);
U1.Q0-.1.1 = (U5.D1-.1);
U1.Q0-.1.0 = (U5.D1-.0);
U1.Q0-.3.12 = (U5.D3-.12);
U1.Q0-.3.11 = (U5.D3-.11);
U1.Q0-.3.10 = (U5.D3-.10);
U1.Q0-.3.9 = (U5.D3-.9);
U1.Q0-.3.8 = (U5.D3-.8);
U1.Q0-.3.7 = (U5.D3-.7);
U1.Q0-.3.6 = (U5.D3-.6);
U1.Q0-.3.5 = (U5.D3-.5);
U1.Q0-.3.4 = (U5.D3-.4);
U1.Q0-.3.3 = (U5.D3-.3);
U1.Q0-.3.2 = (U5.D3-.2);
U1.Q0-.3.1 = (U5.D3-.1);
U1.Q0-.3.0 = (U5.D3-.0);
```

```
U1.Q0-.2.12 = (U5.D2-.12);
U1.Q0-.2.11 = (U5.D2-.11);
U1.Q0-.2.10 = (U5.D2-.10);
U1.Q0-.2.9 = (U5.D2-.9);
U1.Q0-.2.8 = (U5.D2-.8);
U1.Q0-.2.7 = (U5.D2-.7);
U1.Q0-.2.6 = (U5.D2-.6);
U1.Q0-.2.5 = (U5.D2-.5);
U1.Q0-.2.4 = (U5.D2-.4);
U1.Q0-.2.3 = (U5.D2-.3);
U1.Q0-.2.2 = (U5.D2-.2);
U1.Q0-.2.1 = (U5.D2-.1);
U1.Q0-.2.0 = (U5.D2-.0);
U1.Q0-.0.12 = (U5.D0-.12);
U1.Q0-.0.11 = (U5.D0-.11);
U1.Q0-.0.10 = (U5.D0-.10);
U1.Q0-.0.9 = (U5.D0-.9);
U1.Q0-.0.8 = (U5.D0-.8);
U1.Q0-.0.7 = (U5.D0-.7);
U1.Q0-.0.6 = (U5.D0-.6);
U1.Q0-.0.5 = (U5.D0-.5);
U1.Q0-.0.4 = (U5.D0-.4);
U1.Q0-.0.3 = (U5.D0-.3);
U1.Q0-.0.2 = (U5.D0-.2);
U1.Q0-.0.1 = (U5.D0-.1);
U1.Q0-.0.0 = (U5.D0-.0);
U1.Q2-.1.12 = (U3.D1-.12);
U1.Q2-.1.11 = (U3.D1-.11);
U1.Q2-.1.10 = (U3.D1-.10);
U1.Q2-.1.9 = (U3.D1-.9);
U1.Q2-.1.8 = (U3.D1-.8);
U1.Q2-.1.7 = (U3.D1-.7);
U1.Q2-.1.6 = (U3.D1-.6);
U1.Q2-.1.5 = (U3.D1-.5);
U1.Q2-.1.4 = (U3.D1-.4);
U1.Q2-.1.3 = (U3.D1-.3);
U1.Q2-.1.2 = (U3.D1-.2);
U1.Q2-.1.1 = (U3.D1-.1);
U1.Q2-.1.0 = (U3.D1-.0);
U1.Q2-.2.12 = (U3.D2-.12);
U1.Q2-.2.11 = (U3.D2-.11);
U1.Q2-.2.10 = (U3.D2-.10);
U1.Q2-.2.9 = (U3.D2-.9);
U1.Q2-.2.8 = (U3.D2-.8);
U1.Q2-.2.7 = (U3.D2-.7);
U1.Q2-.2.6 = (U3.D2-.6);
U1.Q2-.2.5 = (U3.D2-.5);
U1.Q2-.2.4 = (U3.D2-.4);
U1.Q2-.2.3 = (U3.D2-.3);
U1.Q2-.2.2 = (U3.D2-.2);
U1.Q2-.2.1 = (U3.D2-.1);
U1.Q2-.2.0 = (U3.D2-.0);
U1.Q2-.3.12 = (U3.D3-.12);
U1.Q2-.3.11 = (U3.D3-.11);
U1.Q2-.3.10 = (U3.D3-.10);
U1.Q2-.3.9 = (U3.D3-.9);
U1.Q2-.3.8 = (U3.D3-.8);
U1.Q2-.3.7 = (U3.D3-.7);
U1.Q2-.3.6 = (U3.D3-.6);
U1.Q2-.3.5 = (U3.D3-.5);
U1.Q2-.3.4 = (U3.D3-.4);
U1.Q2-.3.3 = (U3.D3-.3);
U1.Q2-.3.2 = (U3.D3-.2);
U1.Q2-.3.1 = (U3.D3-.1);
U1.Q2-.3.0 = (U3.D3-.0);
U1.Q2-.0.12 = (U3.D0-.12);
U1.Q2-.0.11 = (U3.D0-.11);
U1.Q2-.0.10 = (U3.D0-.10);
U1.Q2-.0.9 = (U3.D0-.9);
U1.Q2-.0.8 = (U3.D0-.8);
U1.Q2-.0.7 = (U3.D0-.7);
U1.Q2-.0.6 = (U3.D0-.6);
U1.Q2-.0.5 = (U3.D0-.5);
U1.Q2-.0.4 = (U3.D0-.4);
U1.Q2-.0.3 = (U3.D0-.3);
```

```
    U1.Q2-.0.2 = (U3.D0-.2);
    U1.Q2-.0.1 = (U3.D0-.1);
    U1.Q2-.0.0 = (U3.D0-.0);


  /* type converters *********************/

ANNOTATIONS
{
  BUS BUS_TYPE = "DOT";
}

END MODULE;



/* * * * * * *  Contents of NET file MUX2X1W13X8.NET  * * * * * * */

/*******************************************************/
/*  Netlist copyright (C) 1989 LSI Logic Corporation  */
/*******************************************************/


MODULE MUX2X1W13X8;

INPUTS      D0.12,D0.11,D0.10,D0.9,D0.8,D0.7,D0.6,D0.5,D0.4,D0.3,
            D0.2,D0.1,D0.0,D1.7,D1.6,D1.5,D1.4,D1.3,D1.2,D1.1,
            D1.0,S;
OUTPUTS     Z.12,Z.11,Z.10,Z.9,Z.8,Z.7,Z.6,Z.5,Z.4,Z.3,Z.2,Z.1,
            Z.0;

LEVEL FUNCTION;
DEFINE
  /* implicit connectors *******************/

    D0-.12 = (D0.12);
    D0-.11 = (D0.11);
    D0-.10 = (D0.10);
    D0-.9 = (D0.9);
    D0-.8 = (D0.8);
    D0-.7 = (D0.7);
    D0-.6 = (D0.6);
    D0-.5 = (D0.5);
    D0-.4 = (D0.4);
    D0-.3 = (D0.3);
    D0-.2 = (D0.2);
    D0-.1 = (D0.1);
    D0-.0 = (D0.0);
    D1-.7 = (D1.7);
    D1-.6 = (D1.6);
    D1-.5 = (D1.5);
    D1-.4 = (D1.4);
    D1-.3 = (D1.3);
    D1-.2 = (D1.2);
    D1-.1 = (D1.1);
    D1-.0 = (D1.0);
    M-0 = (NC/0/);
    S- = (S);
    Z-.12 = (Z.12);
    Z-.11 = (Z.11);
    Z-.10 = (Z.10);
    Z-.9 = (Z.9);
    Z-.8 = (Z.8);
    Z-.7 = (Z.7);
    Z-.6 = (Z.6);
    Z-.5 = (Z.5);
    Z-.4 = (Z.4);
    Z-.3 = (Z.3);
    Z-.2 = (Z.2);
    Z-.1 = (Z.1);
    Z-.0 = (Z.0);


  /* part instances *************************/
```

```
  U3(U3.Z-=Z) = N1B(S-=A);
  U2(U2.Z-=Z) = N1D(U3.Z-=A);
  U1.12(U1.Z-.12=Z) = MX21LB(D0-.12=A,U1.B-.12=B,U2.Z-=S);
  U1.11(U1.Z-.11=Z) = MX21LB(D0-.11=A,U1.B-.11=B,U2.Z-=S);
  U1.10(U1.Z-.10=Z) = MX21LB(D0-.10=A,U1.B-.10=B,U2.Z-=S);
  U1.9(U1.Z-.9=Z) = MX21LB(D0-.9=A,U1.B-.9=B,U2.Z-=S);
  U1.8(U1.Z-.8=Z) = MX21LB(D0-.8=A,U1.B-.8=B,U2.Z-=S);
  U1.7(U1.Z-.7=Z) = MX21LB(D0-.7=A,U1.B-.7=B,U2.Z-=S);
  U1.6(U1.Z-.6=Z) = MX21LB(D0-.6=A,U1.B-.6=B,U2.Z-=S);
  U1.5(U1.Z-.5=Z) = MX21LB(D0-.5=A,U1.B-.5=B,U2.Z-=S);
  U1.4(U1.Z-.4=Z) = MX21LB(D0-.4=A,U1.B-.4=B,U2.Z-=S);
  U1.3(U1.Z-.3=Z) = MX21LB(D0-.3=A,U1.B-.3=B,U2.Z-=S);
  U1.2(U1.Z-.2=Z) = MX21LB(D0-.2=A,U1.B-.2=B,U2.Z-=S);
  U1.1(U1.Z-.1=Z) = MX21LB(D0-.1=A,U1.B-.1=B,U2.Z-=S);
  U1.0(U1.Z-.0=Z) = MX21LB(D0-.0=A,U1.B-.0=B,U2.Z-=S);
  U0.12(Z-.12=Z) = N1C(U1.Z-.12=A);
  U0.11(Z-.11=Z) = N1C(U1.Z-.11=A);
  U0.10(Z-.10=Z) = N1C(U1.Z-.10=A);
  U0.9(Z-.9=Z) = N1C(U1.Z-.9=A);
  U0.8(Z-.8=Z) = N1C(U1.Z-.8=A);
  U0.7(Z-.7=Z) = N1C(U1.Z-.7=A);
  U0.6(Z-.6=Z) = N1C(U1.Z-.6=A);
  U0.5(Z-.5=Z) = N1C(U1.Z-.5=A);
  U0.4(Z-.4=Z) = N1C(U1.Z-.4=A);
  U0.3(Z-.3=Z) = N1C(U1.Z-.3=A);
  U0.2(Z-.2=Z) = N1C(U1.Z-.2=A);
  U0.1(Z-.1=Z) = N1C(U1.Z-.1=A);
  U0.0(Z-.0=Z) = N1C(U1.Z-.0=A);


/* extractors ******************************/

  U1.B-.12 = (D1-.7);
  U1.B-.11 = (D1-.6);
  U1.B-.10 = (D1-.5);
  U1.B-.9 = (D1-.4);
  U1.B-.8 = (D1-.3);
  U1.B-.7 = (D1-.2);
  U1.B-.6 = (D1-.1);
  U1.B-.5 = (D1-.0);
  U1.B-.0 = (M-0);
  U1.B-.3 = (M-0);
  U1.B-.2 = (M-0);
  U1.B-.1 = (M-0);
  U1.B-.4 = (M-0);

  /* type converters *********************/

ANNOTATIONS
{
  BUS BUS_TYPE = "DOT";
}

END MODULE;


/* * * * * * *  Contents of NET file AVRGV1.NET  * * * * * * */

/*******************************************************/
/*  Netlist copyright (C) 1989 LSI Logic Corporation   */
/*******************************************************/


MODULE AVRGV1;

INPUTS      CP,DLY_POL,DUP,FRST_ROW,LST_ROW,LST_ROW_1,NOS.1,NOS.0,
            PDI.12,PDI.11,PDI.10,PDI.9,PDI.8,PDI.7,PDI.6,PDI.5,
            PDI.4,PDI.3,PDI.2,PDI.1,PDI.0,PLR_CS_,RC0.7,RC0.6,
            RC0.5,RC0.4,RC0.3,RC0.2,RC0.1,RC0.0,RC1.7,RC1.6,RC1.5,
            RC1.4,RC1.3,RC1.2,RC1.1,RC1.0,RC2.7,RC2.6,RC2.5,RC2.4,
            RC2.3,RC2.2,RC2.1,RC2.0,RC3.7,RC3.6,RC3.5,RC3.4,RC3.3,
            RC3.2,RC3.1,RC3.0,RC4.7,RC4.6,RC4.5,RC4.4,RC4.3,RC4.2,
            RC4.1,RC4.0,RESET_,ROW_ORDR.2,ROW_ORDR.1,ROW_ORDR.0,S,
            SCND_ROW,SE,SEL10,SEL11,SPR.1,SPR.0,STB_I,S_MODE,TST,
            WAIT,WR_;
```

```
OUTPUTS      CNVL.12,CNVL.11,CNVL.10,CNVL.9,CNVL.8,CNVL.7,CNVL.6,
             CNVL.5,CNVL.4,CNVL.3,CNVL.2,CNVL.1,CNVL.0,PDO2.15,
             PDO2.14,PDO2.13,PDO2.12,PDO2.11,PDO2.10,PDO2.9,PDO2.8,
             PDO2.7,PDO2.6,PDO2.5,PDO2.4,PDO2.3,PDO2.2,PDO2.1,
             PDO2.0;

LEVEL FUNCTION;
DEFINE
  /* implicit connectors *******************/

    SE- = (SE);
    DUP- = (DUP);
    PLR_CS_- = (PLR_CS_);
    WR_- = (WR_);
    TST- = (TST);
    SPR-.1 = (SPR.1);
    SPR-.0 = (SPR.0);
    CNVL-.12 = (CNVL.12);
    CNVL-.11 = (CNVL.11);
    CNVL-.10 = (CNVL.10);
    CNVL-.9 = (CNVL.9);
    CNVL-.8 = (CNVL.8);
    CNVL-.7 = (CNVL.7);
    CNVL-.6 = (CNVL.6);
    CNVL-.5 = (CNVL.5);
    CNVL-.4 = (CNVL.4);
    CNVL-.3 = (CNVL.3);
    CNVL-.2 = (CNVL.2);
    CNVL-.1 = (CNVL.1);
    CNVL-.0 = (CNVL.0);
    NOS-.1 = (NOS.1);
    NOS-.0 = (NOS.0);
    NOS-.1 = (NOS.1);
    NOS-.0 = (NOS.0);
    DLY_POL- = (DLY_POL);
    DLY_POL- = (DLY_POL);
    BRESET2_- = (BRESET2_);
    BRESET2_- = (BRESET2_);
    CP- = (CP);
    CP- = (CP);
    CP- = (CP);
    CP- = (CP);
    CP- = (CP);
    BWAIT4- = (BWAIT4);
    CP- = (CP);
    BRESET1_- = (BRESET1_);
    M-2 = (NC/0/);
    RESET_- = (RESET_);
    BRESET0_- = (BRESET0_);
    BRESET0_- = (BRESET0_);
    BRESET0_- = (BRESET0_);
    BRESET0_- = (BRESET0_);
    CP- = (CP);
    CP- = (CP);
    BRESET2_- = (BRESET2_);
    CP- = (CP);
    BRESET3_- = (BRESET3_);
    BRESET3_- = (BRESET3_);
    BRESET3_- = (BRESET3_);
    BRESET3_- = (BRESET3_);
    CP- = (CP);
    BWAIT4- = (BWAIT4);
    LST_ROW- = (LST_ROW);
    LST_ROW_1- = (LST_ROW_1);
    SCND_ROW- = (SCND_ROW);
    FRST_ROW- = (FRST_ROW);
    ROW_ORDR-.2 = (ROW_ORDR.2);
    ROW_ORDR-.1 = (ROW_ORDR.1);
    ROW_ORDR-.0 = (ROW_ORDR.0);
    STB_I- = (STB_I);
    BS- = (BS);
    BRESET1_- = (BRESET1_);
    WAIT- = (WAIT);
    BWAIT4- = (BWAIT4);
    BWAIT0- = (BWAIT0);
    BWAIT3- = (BWAIT3);
```

```
BWAIT2- = (BWAIT2);
BWAIT2- = (BWAIT2);
BWAIT2- = (BWAIT2);
BWAIT1- = (BWAIT1);
BWAIT1- = (BWAIT1);
BWAIT1- = (BWAIT1);
CP- = (CP);
BS- = (BS);
BS- = (BS);
BS- = (BS);
S- = (S);
BS- = (BS);
BS- = (BS);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
S_MODE- = (S_MODE);
BWAIT3- = (BWAIT3);
BWAIT3- = (BWAIT3);
SEL11- = (SEL11);
SEL10- = (SEL10);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
M-0 = (NC/0/);
M-1 = (NC/0/);
```

```
BWAIT4- = (BWAIT4);
BWAIT4- = (BWAIT4);
CP- = (CP);
CP- = (CP);
BWAIT0- = (BWAIT0);
BWAIT0- = (BWAIT0);
BWAIT0- = (BWAIT0);
BRESET1_- = (BRESET1_);
BRESET1_- = (BRESET1_);
BRESET2_- = (BRESET2_);
BRESET2_- = (BRESET2_);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);


/* part instances ***************************/

U25(U25.S-.14=S.14,U25.S-.13=S.13,U25.S-.12=S.12,U25.S-.11=S.11,
        U25.S-.10=S.10,U25.S-.9=S.9,U25.S-.8=S.8,U25.S-.7=S.7,
        U25.S-.6=S.6,U25.S-.5=S.5,U25.S-.4=S.4,U25.S-.3=S.3,
        U25.S-.2=S.2,U25.S-.1=S.1,U25.S-.0=S.0) = ADD14F(
        U27.Q-.13=B.13,U27.Q-.12=B.12,U27.Q-.11=B.11,
        U27.Q-.10=B.10,U27.Q-.9=B.9,U27.Q-.8=B.8,U27.Q-.7=B.7,
        U27.Q-.6=B.6,U27.Q-.5=B.5,U27.Q-.4=B.4,U27.Q-.3=B.3,
        U27.Q-.2=B.2,U27.Q-.1=B.1,U27.Q-.0=B.0,U10.Q-.13=A.13,
        U10.Q-.12=A.12,U10.Q-.11=A.11,U10.Q-.10=A.10,U10.Q-.9=A.9,
        U10.Q-.8=A.8,U10.Q-.7=A.7,U10.Q-.6=A.6,U10.Q-.5=A.5,
        U10.Q-.4=A.4,U10.Q-.3=A.3,U10.Q-.2=A.2,U10.Q-.1=A.1,
        U10.Q-.0=A.0);
U34(BRESET0_-=Z) = B3A(RESET_-=A);
U35(BRESET1_-=Z) = B3A(BRESET0_-=A);
U37(BRESET3_-=Z) = B3A(BRESET2_-=A);
U20.4(U20.Z-.4=Z) = B3A(WAIT-=A);
U20.3(U20.Z-.3=Z) = B3A(WAIT-=A);
U20.2(U20.Z-.2=Z) = B3A(WAIT-=A);
U20.1(U20.Z-.1=Z) = B3A(WAIT-=A);
U20.0(U20.Z-.0=Z) = B3A(WAIT-=A);
U13.12(U13.Q-.12=Q) = FD2SA(BRESET1_-=CD,BWAIT1-=TE,CP-=CP,
        U12.Z-.12=D,U13.Q-.12=TI);
U13.11(U13.Q-.11=Q) = FD2SA(BRESET1_-=CD,BWAIT1-=TE,CP-=CP,
        U12.Z-.11=D,U13.Q-.11=TI);
U13.10(U13.Q-.10=Q) = FD2SA(BRESET1_-=CD,BWAIT1-=TE,CP-=CP,
        U12.Z-.10=D,U13.Q-.10=TI);
U13.9(U13.Q-.9=Q) = FD2SA(BRESET1_-=CD,BWAIT1-=TE,CP-=CP,
        U12.Z-.9=D,U13.Q-.9=TI);
U13.8(U13.Q-.8=Q) = FD2SA(BRESET1_-=CD,BWAIT1-=TE,CP-=CP,
        U12.Z-.8=D,U13.Q-.8=TI);
U13.7(U13.Q-.7=Q) = FD2SA(BRESET1_-=CD,BWAIT1-=TE,CP-=CP,
        U12.Z-.7=D,U13.Q-.7=TI);
U13.6(U13.Q-.6=Q) = FD2SA(BRESET1_-=CD,BWAIT1-=TE,CP-=CP,
        U12.Z-.6=D,U13.Q-.6=TI);
U13.5(U13.Q-.5=Q) = FD2SA(BRESET1_-=CD,BWAIT1-=TE,CP-=CP,
        U12.Z-.5=D,U13.Q-.5=TI);
U13.4(U13.Q-.4=Q) = FD2SA(BRESET1_-=CD,BWAIT1-=TE,CP-=CP,
        U12.Z-.4=D,U13.Q-.4=TI);
U13.3(U13.Q-.3=Q) = FD2SA(BRESET1_-=CD,BWAIT1-=TE,CP-=CP,
        U12.Z-.3=D,U13.Q-.3=TI);
U13.2(U13.Q-.2=Q) = FD2SA(BRESET1_-=CD,BWAIT1-=TE,CP-=CP,
        U12.Z-.2=D,U13.Q-.2=TI);
U13.1(U13.Q-.1=Q) = FD2SA(BRESET1_-=CD,BWAIT1-=TE,CP-=CP,
        U12.Z-.1=D,U13.Q-.1=TI);
U13.0(U13.Q-.0=Q) = FD2SA(BRESET1_-=CD,BWAIT1-=TE,CP-=CP,
```

```
        U12.Z-.0=D,U13.Q-.0=TI);
U12(U12.Z-.12=Z.12,U12.Z-.11=Z.11,U12.Z-.10=Z.10,U12.Z-.9=Z.9,
        U12.Z-.8=Z.8,U12.Z-.7=Z.7,U12.Z-.6=Z.6,U12.Z-.5=Z.5,
        U12.Z-.4=Z.4,U12.Z-.3=Z.3,U12.Z-.2=Z.2,U12.Z-.1=Z.1,
        U12.Z-.0=Z.0) = MUX2X1W13X8(U0.Q3-.12=D0.12,U0.Q3-.11=D0.11,
        U0.Q3-.10=D0.10,U0.Q3-.9=D0.9,U0.Q3-.8=D0.8,U0.Q3-.7=D0.7,
        U0.Q3-.6=D0.6,U0.Q3-.5=D0.5,U0.Q3-.4=D0.4,U0.Q3-.3=D0.3,
        U0.Q3-.2=D0.2,U0.Q3-.1=D0.1,U0.Q3-.0=D0.0,BS-=S,
        U2.D1-.7=D1.7,U2.D1-.6=D1.6,U2.D1-.5=D1.5,U2.D1-.4=D1.4,
        U2.D1-.3=D1.3,U2.D1-.2=D1.2,U2.D1-.1=D1.1,U2.D1-.0=D1.0);
U18(U18.Z-.12=Z.12,U18.Z-.11=Z.11,U18.Z-.10=Z.10,U18.Z-.9=Z.9,
        U18.Z-.8=Z.8,U18.Z-.7=Z.7,U18.Z-.6=Z.6,U18.Z-.5=Z.5,
        U18.Z-.4=Z.4,U18.Z-.3=Z.3,U18.Z-.2=Z.2,U18.Z-.1=Z.1,
        U18.Z-.0=Z.0) = MUX2X1W13X8(U0.Q0-.12=D0.12,U0.Q0-.11=D0.11,
        U0.Q0-.10=D0.10,U0.Q0-.9=D0.9,U0.Q0-.8=D0.8,U0.Q0-.7=D0.7,
        U0.Q0-.6=D0.6,U0.Q0-.5=D0.5,U0.Q0-.4=D0.4,U0.Q0-.3=D0.3,
        U0.Q0-.2=D0.2,U0.Q0-.1=D0.1,U0.Q0-.0=D0.0,BS-=S,
        U2.D4-.7=D1.7,U2.D4-.6=D1.6,U2.D4-.5=D1.5,U2.D4-.4=D1.4,
        U2.D4-.3=D1.3,U2.D4-.2=D1.2,U2.D4-.1=D1.1,U2.D4-.0=D1.0);
U1(U1.Z-.12=Z.12,U1.Z-.11=Z.11,U1.Z-.10=Z.10,U1.Z-.9=Z.9,
        U1.Z-.8=Z.8,U1.Z-.7=Z.7,U1.Z-.6=Z.6,U1.Z-.5=Z.5,
        U1.Z-.4=Z.4,U1.Z-.3=Z.3,U1.Z-.2=Z.2,U1.Z-.1=Z.1,
        U1.Z-.0=Z.0) = MUX2X1W13X8(U0.Q4-.12=D0.12,U0.Q4-.11=D0.11,
        U0.Q4-.10=D0.10,U0.Q4-.9=D0.9,U0.Q4-.8=D0.8,U0.Q4-.7=D0.7,
        U0.Q4-.6=D0.6,U0.Q4-.5=D0.5,U0.Q4-.4=D0.4,U0.Q4-.3=D0.3,
        U0.Q4-.2=D0.2,U0.Q4-.1=D0.1,U0.Q4-.0=D0.0,BS-=S,
        U2.D0-.7=D1.7,U2.D0-.6=D1.6,U2.D0-.5=D1.5,U2.D0-.4=D1.4,
        U2.D0-.3=D1.3,U2.D0-.2=D1.2,U2.D0-.1=D1.1,U2.D0-.0=D1.0);
U33(BS-=Z) = B3A(S-=A);
U16(U16.Z-.12=Z.12,U16.Z-.11=Z.11,U16.Z-.10=Z.10,U16.Z-.9=Z.9,
        U16.Z-.8=Z.8,U16.Z-.7=Z.7,U16.Z-.6=Z.6,U16.Z-.5=Z.5,
        U16.Z-.4=Z.4,U16.Z-.3=Z.3,U16.Z-.2=Z.2,U16.Z-.1=Z.1,
        U16.Z-.0=Z.0) = MUX2X1W13X8(U0.Q1-.12=D0.12,U0.Q1-.11=D0.11,
        U0.Q1-.10=D0.10,U0.Q1-.9=D0.9,U0.Q1-.8=D0.8,U0.Q1-.7=D0.7,
        U0.Q1-.6=D0.6,U0.Q1-.5=D0.5,U0.Q1-.4=D0.4,U0.Q1-.3=D0.3,
        U0.Q1-.2=D0.2,U0.Q1-.1=D0.1,U0.Q1-.0=D0.0,BS-=S,
        U2.D3-.7=D1.7,U2.D3-.6=D1.6,U2.D3-.5=D1.5,U2.D3-.4=D1.4,
        U2.D3-.3=D1.3,U2.D3-.2=D1.2,U2.D3-.1=D1.1,U2.D3-.0=D1.0);
U2(U2.D0-.7=D0.7,U2.D0-.6=D0.6,U2.D0-.5=D0.5,U2.D0-.4=D0.4,
        U2.D0-.3=D0.3,U2.D0-.2=D0.2,U2.D0-.1=D0.1,U2.D0-.0=D0.0,
        U2.D1-.7=D1.7,U2.D1-.6=D1.6,U2.D1-.5=D1.5,U2.D1-.4=D1.4,
        U2.D1-.3=D1.3,U2.D1-.2=D1.2,U2.D1-.1=D1.1,U2.D1-.0=D1.0,
        U2.D2-.7=D2.7,U2.D2-.6=D2.6,U2.D2-.5=D2.5,U2.D2-.4=D2.4,
        U2.D2-.3=D2.3,U2.D2-.2=D2.2,U2.D2-.1=D2.1,U2.D2-.0=D2.0,
        U2.D4-.7=D4.7,U2.D4-.6=D4.6,U2.D4-.5=D4.5,U2.D4-.4=D4.4,
        U2.D4-.3=D4.3,U2.D4-.2=D4.2,U2.D4-.1=D4.1,U2.D4-.0=D4.0,
        U2.D3-.7=D3.7,U2.D3-.6=D3.6,U2.D3-.5=D3.5,U2.D3-.4=D3.4,
        U2.D3-.3=D3.3,U2.D3-.2=D3.2,U2.D3-.1=D3.1,U2.D3-.0=D3.0)
         = INP_MUX(BRESET3_-=RESET_,CP-=CP,BWAIT4-=WAIT,
        LST_ROW-=LAST_ROW,LST_ROW_1-=LAST_MINUS1,SCND_ROW-=SECOND_ROW,
        FRST_ROW-=FIRST_ROW,ROW_ORDR-.2=ROW_ORDR.2,
        ROW_ORDR-.1=ROW_ORDR.1,ROW_ORDR-.0=ROW_ORDR.0,STB_I-=STB_I,
        RC4-.7=RC4.7,RC4-.6=RC4.6,RC4-.5=RC4.5,RC4-.4=RC4.4,
        RC4-.3=RC4.3,RC4-.2=RC4.2,RC4-.1=RC4.1,RC4-.0=RC4.0,
        RC3-.7=RC3.7,RC3-.6=RC3.6,RC3-.5=RC3.5,RC3-.4=RC3.4,
        RC3-.3=RC3.3,RC3-.2=RC3.2,RC3-.1=RC3.1,RC3-.0=RC3.0,
        RC2-.7=RC2.7,RC2-.6=RC2.6,RC2-.5=RC2.5,RC2-.4=RC2.4,
        RC2-.3=RC2.3,RC2-.2=RC2.2,RC2-.1=RC2.1,RC2-.0=RC2.0,
        RC1-.7=RC1.7,RC1-.6=RC1.6,RC1-.5=RC1.5,RC1-.4=RC1.4,
        RC1-.3=RC1.3,RC1-.2=RC1.2,RC1-.1=RC1.1,RC1-.0=RC1.0,
        RC0-.7=RC0.7,RC0-.6=RC0.6,RC0-.5=RC0.5,RC0-.4=RC0.4,
        RC0-.3=RC0.3,RC0-.2=RC0.2,RC0-.1=RC0.1,RC0-.0=RC0.0,
        S_MODE-=S_MODE);
U11(U11.Z-.12=Z.12,U11.Z-.11=Z.11,U11.Z-.10=Z.10,U11.Z-.9=Z.9,
        U11.Z-.8=Z.8,U11.Z-.7=Z.7,U11.Z-.6=Z.6,U11.Z-.5=Z.5,
        U11.Z-.4=Z.4,U11.Z-.3=Z.3,U11.Z-.2=Z.2,U11.Z-.1=Z.1,
        U11.Z-.0=Z.0) = MUX2X1W13X8(U0.Q2-.12=D0.12,U0.Q2-.11=D0.11,
        U0.Q2-.10=D0.10,U0.Q2-.9=D0.9,U0.Q2-.8=D0.8,U0.Q2-.7=D0.7,
        U0.Q2-.6=D0.6,U0.Q2-.5=D0.5,U0.Q2-.4=D0.4,U0.Q2-.3=D0.3,
        U0.Q2-.2=D0.2,U0.Q2-.1=D0.1,U0.Q2-.0=D0.0,BS-=S,
        U2.D2-.7=D1.7,U2.D2-.6=D1.6,U2.D2-.5=D1.5,U2.D2-.4=D1.4,
        U2.D2-.3=D1.3,U2.D2-.2=D1.2,U2.D2-.1=D1.1,U2.D2-.0=D1.0);
U15.12(U15.Q-.12=Q) = FD2SA(BRESET2_-=CD,BWAIT2-=TE,CP-=CP,
        U15.Q-.12=TI,U11.Z-.12=D);
```

```
U15.11(U15.Q-.11=Q) = FD2SA(BRESET2_-=CD,BWAIT2-=TE,CP-=CP,
        U15.Q-.11=TI,U11.Z-.11=D);
U15.10(U15.Q-.10=Q) = FD2SA(BRESET2_-=CD,BWAIT2-=TE,CP-=CP,
        U15.Q-.10=TI,U11.Z-.10=D);
U15.9(U15.Q-.9=Q) = FD2SA(BRESET2_-=CD,BWAIT2-=TE,CP-=CP,
        U15.Q-.9=TI,U11.Z-.9=D);
U15.8(U15.Q-.8=Q) = FD2SA(BRESET2_-=CD,BWAIT2-=TE,CP-=CP,
        U15.Q-.8=TI,U11.Z-.8=D);
U15.7(U15.Q-.7=Q) = FD2SA(BRESET2_-=CD,BWAIT2-=TE,CP-=CP,
        U15.Q-.7=TI,U11.Z-.7=D);
U15.6(U15.Q-.6=Q) = FD2SA(BRESET2_-=CD,BWAIT2-=TE,CP-=CP,
        U15.Q-.6=TI,U11.Z-.6=D);
U15.5(U15.Q-.5=Q) = FD2SA(BRESET2_-=CD,BWAIT2-=TE,CP-=CP,
        U15.Q-.5=TI,U11.Z-.5=D);
U15.4(U15.Q-.4=Q) = FD2SA(BRESET2_-=CD,BWAIT2-=TE,CP-=CP,
        U15.Q-.4=TI,U11.Z-.4=D);
U15.3(U15.Q-.3=Q) = FD2SA(BRESET2_-=CD,BWAIT2-=TE,CP-=CP,
        U15.Q-.3=TI,U11.Z-.3=D);
U15.2(U15.Q-.2=Q) = FD2SA(BRESET2_-=CD,BWAIT2-=TE,CP-=CP,
        U15.Q-.2=TI,U11.Z-.2=D);
U15.1(U15.Q-.1=Q) = FD2SA(BRESET2_-=CD,BWAIT2-=TE,CP-=CP,
        U15.Q-.1=TI,U11.Z-.1=D);
U15.0(U15.Q-.0=Q) = FD2SA(BRESET2_-=CD,BWAIT2-=TE,CP-=CP,
        U15.Q-.0=TI,U11.Z-.0=D);
U24(U24.S-.13=S.13,U24.S-.12=S.12,U24.S-.11=S.11,U24.S-.10=S.10,
        U24.S-.9=S.9,U24.S-.8=S.8,U24.S-.7=S.7,U24.S-.6=S.6,
        U24.S-.5=S.5,U24.S-.4=S.4,U24.S-.3=S.3,U24.S-.2=S.2,
        U24.S-.1=S.1,U24.S-.0=S.0) = ADD13F(U15.Q-.12=A.12,
        U15.Q-.11=A.11,U15.Q-.10=A.10,U15.Q-.9=A.9,U15.Q-.8=A.8,
        U15.Q-.7=A.7,U15.Q-.6=A.6,U15.Q-.5=A.5,U15.Q-.4=A.4,
        U15.Q-.3=A.3,U15.Q-.2=A.2,U15.Q-.1=A.1,U15.Q-.0=A.0,
        U17.Q-.12=B.12,U17.Q-.11=B.11,U17.Q-.10=B.10,U17.Q-.9=B.9,
        U17.Q-.8=B.8,U17.Q-.7=B.7,U17.Q-.6=B.6,U17.Q-.5=B.5,
        U17.Q-.4=B.4,U17.Q-.3=B.3,U17.Q-.2=B.2,U17.Q-.1=B.1,
        U17.Q-.0=B.0);
U17.12(U17.Q-.12=Q) = FD2SA(BRESET3_-=CD,CP-=CP,BWAIT3-=TE,
        U16.Z-.12=D,U17.Q-.12=TI);
U17.11(U17.Q-.11=Q) = FD2SA(BRESET3_-=CD,CP-=CP,BWAIT3-=TE,
        U16.Z-.11=D,U17.Q-.11=TI);
U17.10(U17.Q-.10=Q) = FD2SA(BRESET3_-=CD,CP-=CP,BWAIT3-=TE,
        U16.Z-.10=D,U17.Q-.10=TI);
U17.9(U17.Q-.9=Q) = FD2SA(BRESET3_-=CD,CP-=CP,BWAIT3-=TE,
        U16.Z-.9=D,U17.Q-.9=TI);
U17.8(U17.Q-.8=Q) = FD2SA(BRESET3_-=CD,CP-=CP,BWAIT3-=TE,
        U16.Z-.8=D,U17.Q-.8=TI);
U17.7(U17.Q-.7=Q) = FD2SA(BRESET3_-=CD,CP-=CP,BWAIT3-=TE,
        U16.Z-.7=D,U17.Q-.7=TI);
U17.6(U17.Q-.6=Q) = FD2SA(BRESET3_-=CD,CP-=CP,BWAIT3-=TE,
        U16.Z-.6=D,U17.Q-.6=TI);
U17.5(U17.Q-.5=Q) = FD2SA(BRESET3_-=CD,CP-=CP,BWAIT3-=TE,
        U16.Z-.5=D,U17.Q-.5=TI);
U17.4(U17.Q-.4=Q) = FD2SA(BRESET3_-=CD,CP-=CP,BWAIT3-=TE,
        U16.Z-.4=D,U17.Q-.4=TI);
U17.3(U17.Q-.3=Q) = FD2SA(BRESET3_-=CD,CP-=CP,BWAIT3-=TE,
        U16.Z-.3=D,U17.Q-.3=TI);
U17.2(U17.Q-.2=Q) = FD2SA(BRESET3_-=CD,CP-=CP,BWAIT3-=TE,
        U16.Z-.2=D,U17.Q-.2=TI);
U17.1(U17.Q-.1=Q) = FD2SA(BRESET3_-=CD,CP-=CP,BWAIT3-=TE,
        U16.Z-.1=D,U17.Q-.1=TI);
U17.0(U17.Q-.0=Q) = FD2SA(BRESET3_-=CD,CP-=CP,BWAIT3-=TE,
        U16.Z-.0=D,U17.Q-.0=TI);
U6.15(PDO2-.15=Z) = MUX41C(SEL11-=B,SEL10-=A,U6.D2-.15=D2,
        U6.D0-.15=D0,U6.D1-.15=D1,U32.S-.15=D3);
U6.14(PDO2-.14=Z) = MUX41C(SEL11-=B,SEL10-=A,U6.D2-.14=D2,
        U6.D0-.14=D0,U6.D1-.14=D1,U32.S-.14=D3);
U6.13(PDO2-.13=Z) = MUX41C(SEL11-=B,SEL10-=A,U6.D2-.13=D2,
        U6.D0-.13=D0,U6.D1-.13=D1,U32.S-.13=D3);
U6.12(PDO2-.12=Z) = MUX41C(SEL11-=B,SEL10-=A,U6.D2-.12=D2,
        U6.D0-.12=D0,U6.D1-.12=D1,U32.S-.12=D3);
U6.11(PDO2-.11=Z) = MUX41C(SEL11-=B,SEL10-=A,U6.D2-.11=D2,
        U6.D0-.11=D0,U6.D1-.11=D1,U32.S-.11=D3);
U6.10(PDO2-.10=Z) = MUX41C(SEL11-=B,SEL10-=A,U6.D2-.10=D2,
        U6.D0-.10=D0,U6.D1-.10=D1,U32.S-.10=D3);
U6.9(PDO2-.9=Z) = MUX41C(SEL11-=B,SEL10-=A,U6.D2-.9=D2,U6.D0-.9=D0,
        U6.D1-.9=D1,U32.S-.9=D3);
```

```
U6.8(PDO2-.8=Z) = MUX41C(SEL11-=B,SEL10-=A,U6.D2-.8=D2,U6.D0-.8=D0,
        U6.D1-.8=D1,U32.S-.8=D3);
U6.7(PDO2-.7=Z) = MUX41C(SEL11-=B,SEL10-=A,U6.D2-.7=D2,U6.D0-.7=D0,
        U6.D1-.7=D1,U32.S-.7=D3);
U6.6(PDO2-.6=Z) = MUX41C(SEL11-=B,SEL10-=A,U6.D2-.6=D2,U6.D0-.6=D0,
        U6.D1-.6=D1,U32.S-.6=D3);
U6.5(PDO2-.5=Z) = MUX41C(SEL11-=B,SEL10-=A,U6.D2-.5=D2,U6.D0-.5=D0,
        U6.D1-.5=D1,U32.S-.5=D3);
U6.4(PDO2-.4=Z) = MUX41C(SEL11-=B,SEL10-=A,U6.D2-.4=D2,U6.D0-.4=D0,
        U6.D1-.4=D1,U32.S-.4=D3);
U6.3(PDO2-.3=Z) = MUX41C(SEL11-=B,SEL10-=A,U6.D2-.3=D2,U6.D0-.3=D0,
        U6.D1-.3=D1,U32.S-.3=D3);
U6.2(PDO2-.2=Z) = MUX41C(SEL11-=B,SEL10-=A,U6.D2-.2=D2,U6.D0-.2=D0,
        U6.D1-.2=D1,U32.S-.2=D3);
U6.1(PDO2-.1=Z) = MUX41C(SEL11-=B,SEL10-=A,U6.D2-.1=D2,U6.D0-.1=D0,
        U6.D1-.1=D1,U32.S-.1=D3);
U6.0(PDO2-.0=Z) = MUX41C(SEL11-=B,SEL10-=A,U6.D2-.0=D2,U6.D0-.0=D0,
        U6.D1-.0=D1,U32.S-.0=D3);
U32(U32.S-.15=S.15,U32.S-.14=S.14,U32.S-.13=S.13,U32.S-.12=S.12,
        U32.S-.11=S.11,U32.S-.10=S.10,U32.S-.9=S.9,U32.S-.8=S.8,
        U32.S-.7=S.7,U32.S-.6=S.6,U32.S-.5=S.5,U32.S-.4=S.4,
        U32.S-.3=S.3,U32.S-.2=S.2,U32.S-.1=S.1,U32.S-.0=S.0)
         = ADD15F(U26.Q-.14=A.14,U26.Q-.13=A.13,U26.Q-.12=A.12,
        U26.Q-.11=A.11,U26.Q-.10=A.10,U26.Q-.9=A.9,U26.Q-.8=A.8,
        U26.Q-.7=A.7,U26.Q-.6=A.6,U26.Q-.5=A.5,U26.Q-.4=A.4,
        U26.Q-.3=A.3,U26.Q-.2=A.2,U26.Q-.1=A.1,U26.Q-.0=A.0,
        U32.B-.14=B.14,U32.B-.13=B.13,U32.B-.12=B.12,
        U32.B-.11=B.11,U32.B-.10=B.10,U32.B-.9=B.9,U32.B-.8=B.8,
        U32.B-.7=B.7,U32.B-.6=B.6,U32.B-.5=B.5,U32.B-.4=B.4,
        U32.B-.3=B.3,U32.B-.2=B.2,U32.B-.1=B.1,U32.B-.0=B.0);
U26.14(U26.Q-.14=Q) = FD2SA(BRESET0_-=CD,CP-=CP,BWAIT3-=TE,
        U26.Q-.14=TI,U25.S-.14=D);
U26.13(U26.Q-.13=Q) = FD2SA(BRESET0_-=CD,CP-=CP,BWAIT3-=TE,
        U26.Q-.13=TI,U25.S-.13=D);
U26.12(U26.Q-.12=Q) = FD2SA(BRESET0_-=CD,CP-=CP,BWAIT3-=TE,
        U26.Q-.12=TI,U25.S-.12=D);
U26.11(U26.Q-.11=Q) = FD2SA(BRESET0_-=CD,CP-=CP,BWAIT3-=TE,
        U26.Q-.11=TI,U25.S-.11=D);
U26.10(U26.Q-.10=Q) = FD2SA(BRESET0_-=CD,CP-=CP,BWAIT3-=TE,
        U26.Q-.10=TI,U25.S-.10=D);
U26.9(U26.Q-.9=Q) = FD2SA(BRESET0_-=CD,CP-=CP,BWAIT3-=TE,
        U26.Q-.9=TI,U25.S-.9=D);
U26.8(U26.Q-.8=Q) = FD2SA(BRESET0_-=CD,CP-=CP,BWAIT3-=TE,
        U26.Q-.8=TI,U25.S-.8=D);
U26.7(U26.Q-.7=Q) = FD2SA(BRESET0_-=CD,CP-=CP,BWAIT3-=TE,
        U26.Q-.7=TI,U25.S-.7=D);
U26.6(U26.Q-.6=Q) = FD2SA(BRESET0_-=CD,CP-=CP,BWAIT3-=TE,
        U26.Q-.6=TI,U25.S-.6=D);
U26.5(U26.Q-.5=Q) = FD2SA(BRESET0_-=CD,CP-=CP,BWAIT3-=TE,
        U26.Q-.5=TI,U25.S-.5=D);
U26.4(U26.Q-.4=Q) = FD2SA(BRESET0_-=CD,CP-=CP,BWAIT3-=TE,
        U26.Q-.4=TI,U25.S-.4=D);
U26.3(U26.Q-.3=Q) = FD2SA(BRESET0_-=CD,CP-=CP,BWAIT3-=TE,
        U26.Q-.3=TI,U25.S-.3=D);
U26.2(U26.Q-.2=Q) = FD2SA(BRESET0_-=CD,CP-=CP,BWAIT3-=TE,
        U26.Q-.2=TI,U25.S-.2=D);
U26.1(U26.Q-.1=Q) = FD2SA(BRESET0_-=CD,CP-=CP,BWAIT3-=TE,
        U26.Q-.1=TI,U25.S-.1=D);
U26.0(U26.Q-.0=Q) = FD2SA(BRESET0_-=CD,CP-=CP,BWAIT3-=TE,
        U26.Q-.0=TI,U25.S-.0=D);
U31.12(U31.Q-.12=Q) = FD2SA(CP-=CP,BWAIT4-=TE,BRESET1_-=CD,
        U30.Q-.12=D,U31.Q-.12=TI);
U31.11(U31.Q-.11=Q) = FD2SA(CP-=CP,BWAIT4-=TE,BRESET1_-=CD,
        U30.Q-.11=D,U31.Q-.11=TI);
U31.10(U31.Q-.10=Q) = FD2SA(CP-=CP,BWAIT4-=TE,BRESET1_-=CD,
        U30.Q-.10=D,U31.Q-.10=TI);
U31.9(U31.Q-.9=Q) = FD2SA(CP-=CP,BWAIT4-=TE,BRESET1_-=CD,
        U30.Q-.9=D,U31.Q-.9=TI);
U31.8(U31.Q-.8=Q) = FD2SA(CP-=CP,BWAIT4-=TE,BRESET1_-=CD,
        U30.Q-.8=D,U31.Q-.8=TI);
U31.7(U31.Q-.7=Q) = FD2SA(CP-=CP,BWAIT4-=TE,BRESET1_-=CD,
        U30.Q-.7=D,U31.Q-.7=TI);
U31.6(U31.Q-.6=Q) = FD2SA(CP-=CP,BWAIT4-=TE,BRESET1_-=CD,
        U30.Q-.6=D,U31.Q-.6=TI);
U31.5(U31.Q-.5=Q) = FD2SA(CP-=CP,BWAIT4-=TE,BRESET1_-=CD,
        U30.Q-.5=D,U31.Q-.5=TI);
```

```
U31.4(U31.Q-.4=Q) = FD2SA(CP-=CP,BWAIT4-=TE,BRESET1_-=CD,
        U30.Q-.4=D,U31.Q-.4=TI);
U31.3(U31.Q-.3=Q) = FD2SA(CP-=CP,BWAIT4-=TE,BRESET1_-=CD,
        U30.Q-.3=D,U31.Q-.3=TI);
U31.2(U31.Q-.2=Q) = FD2SA(CP-=CP,BWAIT4-=TE,BRESET1_-=CD,
        U30.Q-.2=D,U31.Q-.2=TI);
U31.1(U31.Q-.1=Q) = FD2SA(CP-=CP,BWAIT4-=TE,BRESET1_-=CD,
        U30.Q-.1=D,U31.Q-.1=TI);
U31.0(U31.Q-.0=Q) = FD2SA(CP-=CP,BWAIT4-=TE,BRESET1_-=CD,
        U30.Q-.0=D,U31.Q-.0=TI);
U22.12(U22.Q-.12=Q) = FD2SA(CP-=CP,BRESET0_-=CD,U18.Z-.12=D,
        BWAIT4-=TE,U22.Q-.12=TI);
U22.11(U22.Q-.11=Q) = FD2SA(CP-=CP,BRESET0_-=CD,U18.Z-.11=D,
        BWAIT4-=TE,U22.Q-.11=TI);
U22.10(U22.Q-.10=Q) = FD2SA(CP-=CP,BRESET0_-=CD,U18.Z-.10=D,
        BWAIT4-=TE,U22.Q-.10=TI);
U22.9(U22.Q-.9=Q) = FD2SA(CP-=CP,BRESET0_-=CD,U18.Z-.9=D,BWAIT4-=TE,
        U22.Q-.9=TI);
U22.8(U22.Q-.8=Q) = FD2SA(CP-=CP,BRESET0_-=CD,U18.Z-.8=D,BWAIT4-=TE,
        U22.Q-.8=TI);
U22.7(U22.Q-.7=Q) = FD2SA(CP-=CP,BRESET0_-=CD,U18.Z-.7=D,BWAIT4-=TE,
        U22.Q-.7=TI);
U22.6(U22.Q-.6=Q) = FD2SA(CP-=CP,BRESET0_-=CD,U18.Z-.6=D,BWAIT4-=TE,
        U22.Q-.6=TI);
U22.5(U22.Q-.5=Q) = FD2SA(CP-=CP,BRESET0_-=CD,U18.Z-.5=D,BWAIT4-=TE,
        U22.Q-.5=TI);
U22.4(U22.Q-.4=Q) = FD2SA(CP-=CP,BRESET0_-=CD,U18.Z-.4=D,BWAIT4-=TE,
        U22.Q-.4=TI);
U22.3(U22.Q-.3=Q) = FD2SA(CP-=CP,BRESET0_-=CD,U18.Z-.3=D,BWAIT4-=TE,
        U22.Q-.3=TI);
U22.2(U22.Q-.2=Q) = FD2SA(CP-=CP,BRESET0_-=CD,U18.Z-.2=D,BWAIT4-=TE,
        U22.Q-.2=TI);
U22.1(U22.Q-.1=Q) = FD2SA(CP-=CP,BRESET0_-=CD,U18.Z-.1=D,BWAIT4-=TE,
        U22.Q-.1=TI);
U22.0(U22.Q-.0=Q) = FD2SA(CP-=CP,BRESET0_-=CD,U18.Z-.0=D,BWAIT4-=TE,
        U22.Q-.0=TI);
U30.12(U30.Q-.12=Q) = FD2SA(U30.Q-.12=TI,CP-=CP,BRESET3_-=CD,
        BWAIT2-=TE,U22.Q-.12=D);
U30.11(U30.Q-.11=Q) = FD2SA(U30.Q-.11=TI,CP-=CP,BRESET3_-=CD,
        BWAIT2-=TE,U22.Q-.11=D);
U30.10(U30.Q-.10=Q) = FD2SA(U30.Q-.10=TI,CP-=CP,BRESET3_-=CD,
        BWAIT2-=TE,U22.Q-.10=D);
U30.9(U30.Q-.9=Q) = FD2SA(U30.Q-.9=TI,CP-=CP,BRESET3_-=CD,
        BWAIT2-=TE,U22.Q-.9=D);
U30.8(U30.Q-.8=Q) = FD2SA(U30.Q-.8=TI,CP-=CP,BRESET3_-=CD,
        BWAIT2-=TE,U22.Q-.8=D);
U30.7(U30.Q-.7=Q) = FD2SA(U30.Q-.7=TI,CP-=CP,BRESET3_-=CD,
        BWAIT2-=TE,U22.Q-.7=D);
U30.6(U30.Q-.6=Q) = FD2SA(U30.Q-.6=TI,CP-=CP,BRESET3_-=CD,
        BWAIT2-=TE,U22.Q-.6=D);
U30.5(U30.Q-.5=Q) = FD2SA(U30.Q-.5=TI,CP-=CP,BRESET3_-=CD,
        BWAIT2-=TE,U22.Q-.5=D);
U30.4(U30.Q-.4=Q) = FD2SA(U30.Q-.4=TI,CP-=CP,BRESET3_-=CD,
        BWAIT2-=TE,U22.Q-.4=D);
U30.3(U30.Q-.3=Q) = FD2SA(U30.Q-.3=TI,CP-=CP,BRESET3_-=CD,
        BWAIT2-=TE,U22.Q-.3=D);
U30.2(U30.Q-.2=Q) = FD2SA(U30.Q-.2=TI,CP-=CP,BRESET3_-=CD,
        BWAIT2-=TE,U22.Q-.2=D);
U30.1(U30.Q-.1=Q) = FD2SA(U30.Q-.1=TI,CP-=CP,BRESET3_-=CD,
        BWAIT2-=TE,U22.Q-.1=D);
U30.0(U30.Q-.0=Q) = FD2SA(U30.Q-.0=TI,CP-=CP,BRESET3_-=CD,
        BWAIT2-=TE,U22.Q-.0=D);
U27.13(U27.Q-.13=Q) = FD2SA(U27.Q-.13=TI,BWAIT1-=TE,BRESET2_-=CD,
        CP-=CP,U24.S-.13=D);
U27.12(U27.Q-.12=Q) = FD2SA(U27.Q-.12=TI,BWAIT1-=TE,BRESET2_-=CD,
        CP-=CP,U24.S-.12=D);
U27.11(U27.Q-.11=Q) = FD2SA(U27.Q-.11=TI,BWAIT1-=TE,BRESET2_-=CD,
        CP-=CP,U24.S-.11=D);
U27.10(U27.Q-.10=Q) = FD2SA(U27.Q-.10=TI,BWAIT1-=TE,BRESET2_-=CD,
        CP-=CP,U24.S-.10=D);
U27.9(U27.Q-.9=Q) = FD2SA(U27.Q-.9=TI,BWAIT1-=TE,BRESET2_-=CD,
        CP-=CP,U24.S-.9=D);
U27.8(U27.Q-.8=Q) = FD2SA(U27.Q-.8=TI,BWAIT1-=TE,BRESET2_-=CD,
        CP-=CP,U24.S-.8=D);
U27.7(U27.Q-.7=Q) = FD2SA(U27.Q-.7=TI,BWAIT1-=TE,BRESET2_-=CD,
        CP-=CP,U24.S-.7=D);
```

```
U27.6(U27.Q-.6=Q) = FD2SA(U27.Q-.6=TI,BWAIT1-=TE,BRESET2_-=CD,
        CP-=CP,U24.S-.6=D);
U27.5(U27.Q-.5=Q) = FD2SA(U27.Q-.5=TI,BWAIT1-=TE,BRESET2_-=CD,
        CP-=CP,U24.S-.5=D);
U27.4(U27.Q-.4=Q) = FD2SA(U27.Q-.4=TI,BWAIT1-=TE,BRESET2_-=CD,
        CP-=CP,U24.S-.4=D);
U27.3(U27.Q-.3=Q) = FD2SA(U27.Q-.3=TI,BWAIT1-=TE,BRESET2_-=CD,
        CP-=CP,U24.S-.3=D);
U27.2(U27.Q-.2=Q) = FD2SA(U27.Q-.2=TI,BWAIT1-=TE,BRESET2_-=CD,
        CP-=CP,U24.S-.2=D);
U27.1(U27.Q-.1=Q) = FD2SA(U27.Q-.1=TI,BWAIT1-=TE,BRESET2_-=CD,
        CP-=CP,U24.S-.1=D);
U27.0(U27.Q-.0=Q) = FD2SA(U27.Q-.0=TI,BWAIT1-=TE,BRESET2_-=CD,
        CP-=CP,U24.S-.0=D);
U7(U7.S-.13=S.13,U7.S-.12=S.12,U7.S-.11=S.11,U7.S-.10=S.10,
        U7.S-.9=S.9,U7.S-.8=S.8,U7.S-.7=S.7,U7.S-.6=S.6,
        U7.S-.5=S.5,U7.S-.4=S.4,U7.S-.3=S.3,U7.S-.2=S.2,
        U7.S-.1=S.1,U7.S-.0=S.0) = ADD13F(U13.Q-.12=B.12,
        U13.Q-.11=B.11,U13.Q-.10=B.10,U13.Q-.9=B.9,U13.Q-.8=B.8,
        U13.Q-.7=B.7,U13.Q-.6=B.6,U13.Q-.5=B.5,U13.Q-.4=B.4,
        U13.Q-.3=B.3,U13.Q-.2=B.2,U13.Q-.1=B.1,U13.Q-.0=B.0,
        U3.Q-.12=A.12,U3.Q-.11=A.11,U3.Q-.10=A.10,U3.Q-.9=A.9,
        U3.Q-.8=A.8,U3.Q-.7=A.7,U3.Q-.6=A.6,U3.Q-.5=A.5,
        U3.Q-.4=A.4,U3.Q-.3=A.3,U3.Q-.2=A.2,U3.Q-.1=A.1,
        U3.Q-.0=A.0);
U3.12(U3.Q-.12=Q) = FD2SA(BWAIT0-=TE,U1.Z-.12=D,BRESET0_-=CD,CP-=CP,
        U3.Q-.12=TI);
U3.11(U3.Q-.11=Q) = FD2SA(BWAIT0-=TE,U1.Z-.11=D,BRESET0_-=CD,CP-=CP,
        U3.Q-.11=TI);
U3.10(U3.Q-.10=Q) = FD2SA(BWAIT0-=TE,U1.Z-.10=D,BRESET0_-=CD,CP-=CP,
        U3.Q-.10=TI);
U3.9(U3.Q-.9=Q) = FD2SA(BWAIT0-=TE,U1.Z-.9=D,BRESET0_-=CD,CP-=CP,
        U3.Q-.9=TI);
U3.8(U3.Q-.8=Q) = FD2SA(BWAIT0-=TE,U1.Z-.8=D,BRESET0_-=CD,CP-=CP,
        U3.Q-.8=TI);
U3.7(U3.Q-.7=Q) = FD2SA(BWAIT0-=TE,U1.Z-.7=D,BRESET0_-=CD,CP-=CP,
        U3.Q-.7=TI);
U3.6(U3.Q-.6=Q) = FD2SA(BWAIT0-=TE,U1.Z-.6=D,BRESET0_-=CD,CP-=CP,
        U3.Q-.6=TI);
U3.5(U3.Q-.5=Q) = FD2SA(BWAIT0-=TE,U1.Z-.5=D,BRESET0_-=CD,CP-=CP,
        U3.Q-.5=TI);
U3.4(U3.Q-.4=Q) = FD2SA(BWAIT0-=TE,U1.Z-.4=D,BRESET0_-=CD,CP-=CP,
        U3.Q-.4=TI);
U3.3(U3.Q-.3=Q) = FD2SA(BWAIT0-=TE,U1.Z-.3=D,BRESET0_-=CD,CP-=CP,
        U3.Q-.3=TI);
U3.2(U3.Q-.2=Q) = FD2SA(BWAIT0-=TE,U1.Z-.2=D,BRESET0_-=CD,CP-=CP,
        U3.Q-.2=TI);
U3.1(U3.Q-.1=Q) = FD2SA(BWAIT0-=TE,U1.Z-.1=D,BRESET0_-=CD,CP-=CP,
        U3.Q-.1=TI);
U3.0(U3.Q-.0=Q) = FD2SA(BWAIT0-=TE,U1.Z-.0=D,BRESET0_-=CD,CP-=CP,
        U3.Q-.0=TI);
U10.13(U10.Q-.13=Q) = FD2SA(CP-=CP,BRESET1_-=CD,U10.Q-.13=TI,
        U7.S-.13=D,BWAIT0-=TE);
U10.12(U10.Q-.12=Q) = FD2SA(CP-=CP,BRESET1_-=CD,U10.Q-.12=TI,
        U7.S-.12=D,BWAIT0-=TE);
U10.11(U10.Q-.11=Q) = FD2SA(CP-=CP,BRESET1_-=CD,U10.Q-.11=TI,
        U7.S-.11=D,BWAIT0-=TE);
U10.10(U10.Q-.10=Q) = FD2SA(CP-=CP,BRESET1_-=CD,U10.Q-.10=TI,
        U7.S-.10=D,BWAIT0-=TE);
U10.9(U10.Q-.9=Q) = FD2SA(CP-=CP,BRESET1_-=CD,U10.Q-.9=TI,
        U7.S-.9=D,BWAIT0-=TE);
U10.8(U10.Q-.8=Q) = FD2SA(CP-=CP,BRESET1_-=CD,U10.Q-.8=TI,
        U7.S-.8=D,BWAIT0-=TE);
U10.7(U10.Q-.7=Q) = FD2SA(CP-=CP,BRESET1_-=CD,U10.Q-.7=TI,
        U7.S-.7=D,BWAIT0-=TE);
U10.6(U10.Q-.6=Q) = FD2SA(CP-=CP,BRESET1_-=CD,U10.Q-.6=TI,
        U7.S-.6=D,BWAIT0-=TE);
U10.5(U10.Q-.5=Q) = FD2SA(CP-=CP,BRESET1_-=CD,U10.Q-.5=TI,
        U7.S-.5=D,BWAIT0-=TE);
U10.4(U10.Q-.4=Q) = FD2SA(CP-=CP,BRESET1_-=CD,U10.Q-.4=TI,
        U7.S-.4=D,BWAIT0-=TE);
U10.3(U10.Q-.3=Q) = FD2SA(CP-=CP,BRESET1_-=CD,U10.Q-.3=TI,
        U7.S-.3=D,BWAIT0-=TE);
U10.2(U10.Q-.2=Q) = FD2SA(CP-=CP,BRESET1_-=CD,U10.Q-.2=TI,
        U7.S-.2=D,BWAIT0-=TE);
```

```
U10.1(U10.Q-.1=Q) = FD2SA(CP-=CP,BRESET1_-=CD,U10.Q-.1=TI,
        U7.S-.1=D,BWAIT0-=TE);
U10.0(U10.Q-.0=Q) = FD2SA(CP-=CP,BRESET1_-=CD,U10.Q-.0=TI,
        U7.S-.0=D,BWAIT0-=TE);
U36(BRESET2_-=Z) = B3A(BRESET1_-=A);
U38.12(U38.QD-.12=QD,CNVL-.12=Q0) = SRDLYAV(NOS-.1=NOS.1,NOS-.0=NOS.0,
        DLY_POL-=DLY_POL,CP-=CP,BWAIT0-=WAIT,U38.D-.12=D,
        BRESET2_-=RESET_);
U38.11(U38.QD-.11=QD,CNVL-.11=Q0) = SRDLYAV(NOS-.1=NOS.1,NOS-.0=NOS.0,
        DLY_POL-=DLY_POL,CP-=CP,BWAIT0-=WAIT,U38.D-.11=D,
        BRESET2_-=RESET_);
U38.10(U38.QD-.10=QD,CNVL-.10=Q0) = SRDLYAV(NOS-.1=NOS.1,NOS-.0=NOS.0,
        DLY_POL-=DLY_POL,CP-=CP,BWAIT0-=WAIT,U38.D-.10=D,
        BRESET2_-=RESET_);
U38.9(U38.QD-.9=QD,CNVL-.9=Q0) = SRDLYAV(NOS-.1=NOS.1,NOS-.0=NOS.0,
        DLY_POL-=DLY_POL,CP-=CP,BWAIT0-=WAIT,U38.D-.9=D,
        BRESET2_-=RESET_);
U38.8(U38.QD-.8=QD,CNVL-.8=Q0) = SRDLYAV(NOS-.1=NOS.1,NOS-.0=NOS.0,
        DLY_POL-=DLY_POL,CP-=CP,BWAIT0-=WAIT,U38.D-.8=D,
        BRESET2_-=RESET_);
U38.7(U38.QD-.7=QD,CNVL-.7=Q0) = SRDLYAV(NOS-.1=NOS.1,NOS-.0=NOS.0,
        DLY_POL-=DLY_POL,CP-=CP,BWAIT0-=WAIT,U38.D-.7=D,
        BRESET2_-=RESET_);
U38.6(U38.QD-.6=QD,CNVL-.6=Q0) = SRDLYAV(NOS-.1=NOS.1,NOS-.0=NOS.0,
        DLY_POL-=DLY_POL,CP-=CP,BWAIT0-=WAIT,U38.D-.6=D,
        BRESET2_-=RESET_);
U38.5(U38.QD-.5=QD,CNVL-.5=Q0) = SRDLYAV(NOS-.1=NOS.1,NOS-.0=NOS.0,
        DLY_POL-=DLY_POL,CP-=CP,BWAIT0-=WAIT,U38.D-.5=D,
        BRESET2_-=RESET_);
U38.4(U38.QD-.4=QD,CNVL-.4=Q0) = SRDLYAV(NOS-.1=NOS.1,NOS-.0=NOS.0,
        DLY_POL-=DLY_POL,CP-=CP,BWAIT0-=WAIT,U38.D-.4=D,
        BRESET2_-=RESET_);
U38.3(U38.QD-.3=QD,CNVL-.3=Q0) = SRDLYAV(NOS-.1=NOS.1,NOS-.0=NOS.0,
        DLY_POL-=DLY_POL,CP-=CP,BWAIT0-=WAIT,U38.D-.3=D,
        BRESET2_-=RESET_);
U38.2(U38.QD-.2=QD,CNVL-.2=Q0) = SRDLYAV(NOS-.1=NOS.1,NOS-.0=NOS.0,
        DLY_POL-=DLY_POL,CP-=CP,BWAIT0-=WAIT,U38.D-.2=D,
        BRESET2_-=RESET_);
U38.1(U38.QD-.1=QD,CNVL-.1=Q0) = SRDLYAV(NOS-.1=NOS.1,NOS-.0=NOS.0,
        DLY_POL-=DLY_POL,CP-=CP,BWAIT0-=WAIT,U38.D-.1=D,
        BRESET2_-=RESET_);
U38.0(U38.QD-.0=QD,CNVL-.0=Q0) = SRDLYAV(NOS-.1=NOS.1,NOS-.0=NOS.0,
        DLY_POL-=DLY_POL,CP-=CP,BWAIT0-=WAIT,U38.D-.0=D,
        BRESET2_-=RESET_);
U0(U0.Q0-.12=Q0.12,U0.Q0-.11=Q0.11,U0.Q0-.10=Q0.10,U0.Q0-.9=Q0.9,
        U0.Q0-.8=Q0.8,U0.Q0-.7=Q0.7,U0.Q0-.6=Q0.6,U0.Q0-.5=Q0.5,
        U0.Q0-.4=Q0.4,U0.Q0-.3=Q0.3,U0.Q0-.2=Q0.2,U0.Q0-.1=Q0.1,
        U0.Q0-.0=Q0.0,U0.Q1-.12=Q1.12,U0.Q1-.11=Q1.11,
        U0.Q1-.10=Q1.10,U0.Q1-.9=Q1.9,U0.Q1-.8=Q1.8,U0.Q1-.7=Q1.7,
        U0.Q1-.6=Q1.6,U0.Q1-.5=Q1.5,U0.Q1-.4=Q1.4,U0.Q1-.3=Q1.3,
        U0.Q1-.2=Q1.2,U0.Q1-.1=Q1.1,U0.Q1-.0=Q1.0,U0.Q2-.12=Q2.12,
        U0.Q2-.11=Q2.11,U0.Q2-.10=Q2.10,U0.Q2-.9=Q2.9,
        U0.Q2-.8=Q2.8,U0.Q2-.7=Q2.7,U0.Q2-.6=Q2.6,U0.Q2-.5=Q2.5,
        U0.Q2-.4=Q2.4,U0.Q2-.3=Q2.3,U0.Q2-.2=Q2.2,U0.Q2-.1=Q2.1,
        U0.Q2-.0=Q2.0,U0.Q3-.12=Q3.12,U0.Q3-.11=Q3.11,
        U0.Q3-.10=Q3.10,U0.Q3-.9=Q3.9,U0.Q3-.8=Q3.8,U0.Q3-.7=Q3.7,
        U0.Q3-.6=Q3.6,U0.Q3-.5=Q3.5,U0.Q3-.4=Q3.4,U0.Q3-.3=Q3.3,
        U0.Q3-.2=Q3.2,U0.Q3-.1=Q3.1,U0.Q3-.0=Q3.0,U0.Q4-.12=Q4.12,
        U0.Q4-.11=Q4.11,U0.Q4-.10=Q4.10,U0.Q4-.9=Q4.9,
        U0.Q4-.8=Q4.8,U0.Q4-.7=Q4.7,U0.Q4-.6=Q4.6,U0.Q4-.5=Q4.5,
        U0.Q4-.4=Q4.4,U0.Q4-.3=Q4.3,U0.Q4-.2=Q4.2,U0.Q4-.1=Q4.1,
        U0.Q4-.0=Q4.0) = PLREGV2(BWAIT4-=WAIT,DLY_POL-=DLY_POL,
        NOS-.1=NOS.1,NOS-.0=NOS.0,BRESET2_-=RESET_,CP-=CP,SE-=SE,
        DUP-=DUP,PDI-.12=PDI.12,PDI-.11=PDI.11,PDI-.10=PDI.10,
        PDI-.9=PDI.9,PDI-.8=PDI.8,PDI-.7=PDI.7,PDI-.6=PDI.6,
        PDI-.5=PDI.5,PDI-.4=PDI.4,PDI-.3=PDI.3,PDI-.2=PDI.2,
        PDI-.1=PDI.1,PDI-.0=PDI.0,PLR_CS_-=PLR_CS_,WR_-=WR_,
        TST-=TST,SPR-.1=SPR.1,SPR-.0=SPR.0,U38.QD-.12=D.12,
        U38.QD-.11=D.11,U38.QD-.10=D.10,U38.QD-.9=D.9,
        U38.QD-.8=D.8,U38.QD-.7=D.7,U38.QD-.6=D.6,U38.QD-.5=D.5,
        U38.QD-.4=D.4,U38.QD-.3=D.3,U38.QD-.2=D.2,U38.QD-.1=D.1,
        U38.QD-.0=D.0);
```

```
/* extractors ******************************/

 U6.D0-.14 = (M-2);
 U6.D1-.14 = (M-2);
 U20.Z-.4 = (BWAIT4-);
 U20.Z-.0 = (BWAIT0-);
 U20.Z-.3 = (BWAIT3-);
 U20.Z-.2 = (BWAIT2-);
 U20.Z-.1 = (BWAIT1-);
 U32.S-.15 = (U38.D-.12);
 U32.S-.14 = (U38.D-.11);
 U32.S-.13 = (U38.D-.10);
 U32.S-.12 = (U38.D-.9);
 U32.S-.11 = (U38.D-.8);
 U32.S-.10 = (U38.D-.7);
 U32.S-.9 = (U38.D-.6);
 U32.S-.8 = (U38.D-.5);
 U32.S-.7 = (U38.D-.4);
 U32.S-.6 = (U38.D-.3);
 U32.S-.5 = (U38.D-.2);
 U32.S-.4 = (U38.D-.1);
 U32.S-.3 = (U38.D-.0);
 U6.D2-.14 = (U25.S-.14);
 U6.D2-.13 = (U25.S-.13);
 U6.D2-.12 = (U25.S-.12);
 U6.D2-.11 = (U25.S-.11);
 U6.D2-.10 = (U25.S-.10);
 U6.D2-.9 = (U25.S-.9);
 U6.D2-.8 = (U25.S-.8);
 U6.D2-.7 = (U25.S-.7);
 U6.D2-.6 = (U25.S-.6);
 U6.D2-.5 = (U25.S-.5);
 U6.D2-.4 = (U25.S-.4);
 U6.D2-.3 = (U25.S-.3);
 U6.D2-.2 = (U25.S-.2);
 U6.D2-.1 = (U25.S-.1);
 U6.D2-.0 = (U25.S-.0);
 U6.D2-.15 = (M-0);
 U32.B-.14 = (M-1);
 U32.B-.13 = (M-1);
 U32.B-.12 = (U31.Q-.12);
 U32.B-.11 = (U31.Q-.11);
 U32.B-.10 = (U31.Q-.10);
 U32.B-.9 = (U31.Q-.9);
 U32.B-.8 = (U31.Q-.8);
 U32.B-.7 = (U31.Q-.7);
 U32.B-.6 = (U31.Q-.6);
 U32.B-.5 = (U31.Q-.5);
 U32.B-.4 = (U31.Q-.4);
 U32.B-.3 = (U31.Q-.3);
 U32.B-.2 = (U31.Q-.2);
 U32.B-.1 = (U31.Q-.1);
 U32.B-.0 = (U31.Q-.0);
 U6.D1-.13 = (U24.S-.13);
 U6.D1-.12 = (U24.S-.12);
 U6.D1-.11 = (U24.S-.11);
 U6.D1-.10 = (U24.S-.10);
 U6.D1-.9 = (U24.S-.9);
 U6.D1-.8 = (U24.S-.8);
 U6.D1-.7 = (U24.S-.7);
 U6.D1-.6 = (U24.S-.6);
 U6.D1-.5 = (U24.S-.5);
 U6.D1-.4 = (U24.S-.4);
 U6.D1-.3 = (U24.S-.3);
 U6.D1-.2 = (U24.S-.2);
 U6.D1-.1 = (U24.S-.1);
 U6.D1-.0 = (U24.S-.0);
 U6.D1-.15 = (M-2);
 U6.D0-.15 = (M-2);
 U6.D0-.13 = (U7.S-.13);
 U6.D0-.12 = (U7.S-.12);
 U6.D0-.11 = (U7.S-.11);
 U6.D0-.10 = (U7.S-.10);
 U6.D0-.9 = (U7.S-.9);
 U6.D0-.8 = (U7.S-.8);
 U6.D0-.7 = (U7.S-.7);
```

```
    U6.D0-.6 = (U7.S-.6);
    U6.D0-.5 = (U7.S-.5);
    U6.D0-.4 = (U7.S-.4);
    U6.D0-.3 = (U7.S-.3);
    U6.D0-.2 = (U7.S-.2);
    U6.D0-.1 = (U7.S-.1);
    U6.D0-.0 = (U7.S-.0);

  /* type converters ********************/

ANNOTATIONS
{
  BUS BUS_TYPE = "DOT";
}

END MODULE;


/* * * * * * *  Contents of NET file SPT.NET  * * * * * * */


/* * * * * * *  Contents of NET file SPT_V1.NET  * * * * * * */

/*****************************************************/
/*  Netlist copyright (C) 1989 LSI Logic Corporation  */
/*****************************************************/


MODULE SPT_V1;

INPUTS       ALE,COF_ADRIN.2,COF_ADRIN.1,COF_ADRIN.0,CP,CS_,
             INT_GT_1IN,MPA.7,MPA.6,MPA.5,MPA.4,MPA.3,MPA.2,MPA.1,
             MPA.0,MPD.15,MPD.14,MPD.13,MPD.12,MPD.11,MPD.10,MPD.9,
             MPD.8,MPD.7,MPD.6,MPD.5,MPD.4,MPD.3,MPD.2,MPD.1,MPD.0,
             PXL_EN,RC0.7,RC0.6,RC0.5,RC0.4,RC0.3,RC0.2,RC0.1,
             RC0.0,RC1.7,RC1.6,RC1.5,RC1.4,RC1.3,RC1.2,RC1.1,RC1.0,
             RC2.7,RC2.6,RC2.5,RC2.4,RC2.3,RC2.2,RC2.1,RC2.0,RC3.7,
             RC3.6,RC3.5,RC3.4,RC3.3,RC3.2,RC3.1,RC3.0,RC4.7,RC4.6,
             RC4.5,RC4.4,RC4.3,RC4.2,RC4.1,RC4.0,RDY_I,RD_,RESET_,
             STOP,STRT,TST,WAIT,WR_,XSCNIN,YDWN,YSCNIN,YUP;
OUTPUTS      BMYL.4,BMYL.3,BMYL.2,BMYL.1,BMYL.0,CLRXCNT_,CNVL.12,
             CNVL.11,CNVL.10,CNVL.9,CNVL.8,CNVL.7,CNVL.6,CNVL.5,
             CNVL.4,CNVL.3,CNVL.2,CNVL.1,CNVL.0,MPD.15,MPD.14,
             MPD.13,MPD.12,MPD.11,MPD.10,MPD.9,MPD.8,MPD.7,MPD.6,
             MPD.5,MPD.4,MPD.3,MPD.2,MPD.1,MPD.0,PTST,REQ_I,REQ_O,
             STB_I,YINT,YINTSND;

LEVEL FUNCTION;

DEFINE
  /* implicit connectors *******************/

    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    REQ_O- = (REQ_O);
    CNVL-.12 = (CNVL.12);
    CNVL-.11 = (CNVL.11);
    CNVL-.10 = (CNVL.10);
    CNVL-.9 = (CNVL.9);
    CNVL-.8 = (CNVL.8);
    CNVL-.7 = (CNVL.7);
    CNVL-.6 = (CNVL.6);
    CNVL-.5 = (CNVL.5);
    CNVL-.4 = (CNVL.4);
    CNVL-.3 = (CNVL.3);
    CNVL-.2 = (CNVL.2);
    CNVL-.1 = (CNVL.1);
    CNVL-.0 = (CNVL.0);
    YINT- = (YINT);
    YINTSND- = (YINTSND);
    REQ_I- = (REQ_I);
```

```
STB_I- = (STB_I);
CLRXCNT_- = (CLRXCNT_);
WR_- = (WR_);
ALE- = (ALE);
MPA-.7 = (MPA.7);
MPA-.6 = (MPA.6);
MPA-.5 = (MPA.5);
MPA-.4 = (MPA.4);
MPA-.3 = (MPA.3);
MPA-.2 = (MPA.2);
MPA-.1 = (MPA.1);
MPA-.0 = (MPA.0);
WAIT- = (WAIT);
STRT- = (STRT);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
COF_ADRIN-.2 = (COF_ADRIN.2);
COF_ADRIN-.1 = (COF_ADRIN.1);
COF_ADRIN-.0 = (COF_ADRIN.0);
INT_GT_1IN- = (INT_GT_1IN);
STOP- = (STOP);
RD_- = (RD_);
CS_- = (CS_);
RDY_I- = (RDY_I);
RESET_- = (RESET_);
YUP- = (YUP);
U33.PI- = (NC/1/);
U28.TN- = (NC/1/);
MPD-.15 = (MPD.15);
MPD-.14 = (MPD.14);
MPD-.13 = (MPD.13);
MPD-.12 = (MPD.12);
MPD-.11 = (MPD.11);
MPD-.10 = (MPD.10);
MPD-.9 = (MPD.9);
MPD-.8 = (MPD.8);
MPD-.7 = (MPD.7);
MPD-.6 = (MPD.6);
```

```
  MPD-.5 = (MPD.5);
  MPD-.4 = (MPD.4);
  MPD-.3 = (MPD.3);
  MPD-.2 = (MPD.2);
  MPD-.1 = (MPD.1);
  MPD-.0 = (MPD.0);
  PTST- = (PTST);
  CP- = (CP);
  YSCNIN- = (YSCNIN);
  XSCNIN- = (XSCNIN);
  TST- = (TST);
  PXL_EN- = (PXL_EN);
  YDWN- = (YDWN);


/* part instances ****************************/

  U34.4(BMYL-.4=Z) = &B8R(U0.BMYL-.4=A);
  U34.3(BMYL-.3=Z) = &B8R(U0.BMYL-.3=A);
  U34.2(BMYL-.2=Z) = &B8R(U0.BMYL-.2=A);
  U34.1(BMYL-.1=Z) = &B8R(U0.BMYL-.1=A);
  U34.0(BMYL-.0=Z) = &B8R(U0.BMYL-.0=A);
  U22(REQ_O-=Z) = &B8R(U0.REQ_O-=A);
  U23.12(CNVL-.12=Z) = &B10R(U0.CNVL-.12=A);
  U23.11(CNVL-.11=Z) = &B10R(U0.CNVL-.11=A);
  U23.10(CNVL-.10=Z) = &B10R(U0.CNVL-.10=A);
  U23.9(CNVL-.9=Z) = &B10R(U0.CNVL-.9=A);
  U23.8(CNVL-.8=Z) = &B10R(U0.CNVL-.8=A);
  U23.7(CNVL-.7=Z) = &B10R(U0.CNVL-.7=A);
  U23.6(CNVL-.6=Z) = &B10R(U0.CNVL-.6=A);
  U23.5(CNVL-.5=Z) = &B10R(U0.CNVL-.5=A);
  U23.4(CNVL-.4=Z) = &B10R(U0.CNVL-.4=A);
  U23.3(CNVL-.3=Z) = &B10R(U0.CNVL-.3=A);
  U23.2(CNVL-.2=Z) = &B10R(U0.CNVL-.2=A);
  U23.1(CNVL-.1=Z) = &B10R(U0.CNVL-.1=A);
  U23.0(CNVL-.0=Z) = &B10R(U0.CNVL-.0=A);
  U24(YINT-=Z) = &B8R(U0.YINT-=A);
  U25(YINTSND-=Z) = &B8R(U0.YINTSND-=A);
  U26(REQ_I-=Z) = &B8R(U0.REQ_I-=A);
  U27(STB_I-=Z) = &B10R(U0.STB_I-=A);
  U5(CLRXCNT_-=Z) = &B8R(U0.CLRXCNT_-=A);
  U9.7(U9.Z-.7=Z,U9.PO-.7=PO) = &TLCHTU(U9.PI-.7=PI,MPA-.7=A);
  U9.6(U9.Z-.6=Z,U9.PO-.6=PO) = &TLCHTU(U9.PI-.6=PI,MPA-.6=A);
  U9.5(U9.Z-.5=Z,U9.PO-.5=PO) = &TLCHTU(U9.PI-.5=PI,MPA-.5=A);
  U9.4(U9.Z-.4=Z,U9.PO-.4=PO) = &TLCHTU(U9.PI-.4=PI,MPA-.4=A);
  U9.3(U9.Z-.3=Z,U9.PO-.3=PO) = &TLCHTU(U9.PI-.3=PI,MPA-.3=A);
  U9.2(U9.Z-.2=Z,U9.PO-.2=PO) = &TLCHTU(U9.PI-.2=PI,MPA-.2=A);
  U9.1(U9.Z-.1=Z,U9.PO-.1=PO) = &TLCHTU(U9.PI-.1=PI,MPA-.1=A);
  U9.0(U9.Z-.0=Z,U9.PO-.0=PO) = &TLCHTU(U9.PI-.0=PI,MPA-.0=A);
  U4.7(U4.Z-.7=Z,U4.PO-.7=PO) = &TLCHTU(U4.PI-.7=PI,RC4-.7=A);
  U4.6(U4.Z-.6=Z,U4.PO-.6=PO) = &TLCHTU(U4.PI-.6=PI,RC4-.6=A);
  U4.5(U4.Z-.5=Z,U4.PO-.5=PO) = &TLCHTU(U4.PI-.5=PI,RC4-.5=A);
  U4.4(U4.Z-.4=Z,U4.PO-.4=PO) = &TLCHTU(U4.PI-.4=PI,RC4-.4=A);
  U4.3(U4.Z-.3=Z,U4.PO-.3=PO) = &TLCHTU(U4.PI-.3=PI,RC4-.3=A);
  U4.2(U4.Z-.2=Z,U4.PO-.2=PO) = &TLCHTU(U4.PI-.2=PI,RC4-.2=A);
  U4.1(U4.Z-.1=Z,U4.PO-.1=PO) = &TLCHTU(U4.PI-.1=PI,RC4-.1=A);
  U4.0(U4.Z-.0=Z,U4.PO-.0=PO) = &TLCHTU(U4.PI-.0=PI,RC4-.0=A);
  U3.7(U3.Z-.7=Z,U3.PO-.7=PO) = &TLCHTU(U3.PI-.7=PI,RC3-.7=A);
  U3.6(U3.Z-.6=Z,U3.PO-.6=PO) = &TLCHTU(U3.PI-.6=PI,RC3-.6=A);
  U3.5(U3.Z-.5=Z,U3.PO-.5=PO) = &TLCHTU(U3.PI-.5=PI,RC3-.5=A);
  U3.4(U3.Z-.4=Z,U3.PO-.4=PO) = &TLCHTU(U3.PI-.4=PI,RC3-.4=A);
  U3.3(U3.Z-.3=Z,U3.PO-.3=PO) = &TLCHTU(U3.PI-.3=PI,RC3-.3=A);
  U3.2(U3.Z-.2=Z,U3.PO-.2=PO) = &TLCHTU(U3.PI-.2=PI,RC3-.2=A);
  U3.1(U3.Z-.1=Z,U3.PO-.1=PO) = &TLCHTU(U3.PI-.1=PI,RC3-.1=A);
  U3.0(U3.Z-.0=Z,U3.PO-.0=PO) = &TLCHTU(U3.PI-.0=PI,RC3-.0=A);
  U21.7(U21.Z-.7=Z,U21.PO-.7=PO) = &TLCHTU(U21.PI-.7=PI,RC2-.7=A);
  U21.6(U21.Z-.6=Z,U21.PO-.6=PO) = &TLCHTU(U21.PI-.6=PI,RC2-.6=A);
  U21.5(U21.Z-.5=Z,U21.PO-.5=PO) = &TLCHTU(U21.PI-.5=PI,RC2-.5=A);
  U21.4(U21.Z-.4=Z,U21.PO-.4=PO) = &TLCHTU(U21.PI-.4=PI,RC2-.4=A);
  U21.3(U21.Z-.3=Z,U21.PO-.3=PO) = &TLCHTU(U21.PI-.3=PI,RC2-.3=A);
  U21.2(U21.Z-.2=Z,U21.PO-.2=PO) = &TLCHTU(U21.PI-.2=PI,RC2-.2=A);
  U21.1(U21.Z-.1=Z,U21.PO-.1=PO) = &TLCHTU(U21.PI-.1=PI,RC2-.1=A);
  U21.0(U21.Z-.0=Z,U21.PO-.0=PO) = &TLCHTU(U21.PI-.0=PI,RC2-.0=A);
  U2.7(U2.Z-.7=Z,U2.PO-.7=PO) = &TLCHTU(U2.PI-.7=PI,RC1-.7=A);
  U2.6(U2.Z-.6=Z,U2.PO-.6=PO) = &TLCHTU(U2.PI-.6=PI,RC1-.6=A);
  U2.5(U2.Z-.5=Z,U2.PO-.5=PO) = &TLCHTU(U2.PI-.5=PI,RC1-.5=A);
```

```
U2.4(U2.Z-.4=Z,U2.PO-.4=PO) = &TLCHTU(U2.PI-.4=PI,RC1-.4=A);
U2.3(U2.Z-.3=Z,U2.PO-.3=PO) = &TLCHTU(U2.PI-.3=PI,RC1-.3=A);
U2.2(U2.Z-.2=Z,U2.PO-.2=PO) = &TLCHTU(U2.PI-.2=PI,RC1-.2=A);
U2.1(U2.Z-.1=Z,U2.PO-.1=PO) = &TLCHTU(U2.PI-.1=PI,RC1-.1=A);
U2.0(U2.Z-.0=Z,U2.PO-.0=PO) = &TLCHTU(U2.PI-.0=PI,RC1-.0=A);
U1.7(U1.Z-.7=Z,U1.PO-.7=PO) = &TLCHTU(U1.PI-.7=PI,RC0-.7=A);
U1.6(U1.Z-.6=Z,U1.PO-.6=PO) = &TLCHTU(U1.PI-.6=PI,RC0-.6=A);
U1.5(U1.Z-.5=Z,U1.PO-.5=PO) = &TLCHTU(U1.PI-.5=PI,RC0-.5=A);
U1.4(U1.Z-.4=Z,U1.PO-.4=PO) = &TLCHTU(U1.PI-.4=PI,RC0-.4=A);
U1.3(U1.Z-.3=Z,U1.PO-.3=PO) = &TLCHTU(U1.PI-.3=PI,RC0-.3=A);
U1.2(U1.Z-.2=Z,U1.PO-.2=PO) = &TLCHTU(U1.PI-.2=PI,RC0-.2=A);
U1.1(U1.Z-.1=Z,U1.PO-.1=PO) = &TLCHTU(U1.PI-.1=PI,RC0-.1=A);
U1.0(U1.Z-.0=Z,U1.PO-.0=PO) = &TLCHTU(U1.PI-.0=PI,RC0-.0=A);
U30.2(U30.Z-.2=Z,U30.PO-.2=PO) = &TLCHTU(COF_ADRIN-.2=A,
        U30.PI-.2=PI);
U30.1(U30.Z-.1=Z,U30.PO-.1=PO) = &TLCHTU(COF_ADRIN-.1=A,
        U30.PI-.1=PI);
U30.0(U30.Z-.0=Z,U30.PO-.0=PO) = &TLCHTU(COF_ADRIN-.0=A,
        U30.PI-.0=PI);
U31(U31.PO-=PO,U31.Z-=Z) = &TLCHTU(INT_GT_1IN-=A,U32.PO-=PI);
U6(U6.Z-=Z,U6.PO-=PO) = &TLCHTU(STRT-=A,U6.PI-=PI);
U7(U7.Z-=Z,U7.PO-=PO) = &TLCHTU(U6.PO-=PI,STOP-=A);
U8(U8.Z-=Z,U8.PO-=PO) = &TLCHTU(WAIT-=A,U7.PO-=PI);
U10(U10.Z-=Z,U10.PO-=PO) = &TLCHTU(ALE-=A,U10.PI-=PI);
U11(U11.Z-=Z,U11.PO-=PO) = &TLCHTU(U10.PO-=PI,RD_-=A);
U12(U12.Z-=Z,U12.PO-=PO) = &TLCHTU(WR_-=A,U11.PO-=PI);
U13(U13.Z-=Z,U13.PO-=PO) = &TLCHTU(U12.PO-=PI,CS_-=A);
U14(U14.Z-=Z,U14.PO-=PO) = &TLCHTU(U13.PO-=PI,RDY_I-=A);
U33(U33.PO-=PO,U33.Z-=Z) = &TLCHTU(YUP-=A,U33.PI-=PI);
U28.15(U28.ZI-.15=ZI,U28.PO-.15=PO,MPD-.15=IO) = &BD6TU(
        U0.MPD_OE_-=EN,U0.PDO-.15=A,U28.TN-=TN,U28.PI-.15=PI);
U28.14(U28.ZI-.14=ZI,U28.PO-.14=PO,MPD-.14=IO) = &BD6TU(
        U0.MPD_OE_-=EN,U0.PDO-.14=A,U28.TN-=TN,U28.PI-.14=PI);
U28.13(U28.ZI-.13=ZI,U28.PO-.13=PO,MPD-.13=IO) = &BD6TU(
        U0.MPD_OE_-=EN,U0.PDO-.13=A,U28.TN-=TN,U28.PI-.13=PI);
U28.12(U28.ZI-.12=ZI,U28.PO-.12=PO,MPD-.12=IO) = &BD6TU(
        U0.MPD_OE_-=EN,U0.PDO-.12=A,U28.TN-=TN,U28.PI-.12=PI);
U28.11(U28.ZI-.11=ZI,U28.PO-.11=PO,MPD-.11=IO) = &BD6TU(
        U0.MPD_OE_-=EN,U0.PDO-.11=A,U28.TN-=TN,U28.PI-.11=PI);
U28.10(U28.ZI-.10=ZI,U28.PO-.10=PO,MPD-.10=IO) = &BD6TU(
        U0.MPD_OE_-=EN,U0.PDO-.10=A,U28.TN-=TN,U28.PI-.10=PI);
U28.9(U28.ZI-.9=ZI,U28.PO-.9=PO,MPD-.9=IO) = &BD6TU(U0.MPD_OE_-=EN,
        U0.PDO-.9=A,U28.TN-=TN,U28.PI-.9=PI);
U28.8(U28.ZI-.8=ZI,U28.PO-.8=PO,MPD-.8=IO) = &BD6TU(U0.MPD_OE_-=EN,
        U0.PDO-.8=A,U28.TN-=TN,U28.PI-.8=PI);
U28.7(U28.ZI-.7=ZI,U28.PO-.7=PO,MPD-.7=IO) = &BD6TU(U0.MPD_OE_-=EN,
        U0.PDO-.7=A,U28.TN-=TN,U28.PI-.7=PI);
U28.6(U28.ZI-.6=ZI,U28.PO-.6=PO,MPD-.6=IO) = &BD6TU(U0.MPD_OE_-=EN,
        U0.PDO-.6=A,U28.TN-=TN,U28.PI-.6=PI);
U28.5(U28.ZI-.5=ZI,U28.PO-.5=PO,MPD-.5=IO) = &BD6TU(U0.MPD_OE_-=EN,
        U0.PDO-.5=A,U28.TN-=TN,U28.PI-.5=PI);
U28.4(U28.ZI-.4=ZI,U28.PO-.4=PO,MPD-.4=IO) = &BD6TU(U0.MPD_OE_-=EN,
        U0.PDO-.4=A,U28.TN-=TN,U28.PI-.4=PI);
U28.3(U28.ZI-.3=ZI,U28.PO-.3=PO,MPD-.3=IO) = &BD6TU(U0.MPD_OE_-=EN,
        U0.PDO-.3=A,U28.TN-=TN,U28.PI-.3=PI);
U28.2(U28.ZI-.2=ZI,U28.PO-.2=PO,MPD-.2=IO) = &BD6TU(U0.MPD_OE_-=EN,
        U0.PDO-.2=A,U28.TN-=TN,U28.PI-.2=PI);
U28.1(U28.ZI-.1=ZI,U28.PO-.1=PO,MPD-.1=IO) = &BD6TU(U0.MPD_OE_-=EN,
        U0.PDO-.1=A,U28.TN-=TN,U28.PI-.1=PI);
U28.0(U28.ZI-.0=ZI,U28.PO-.0=PO,MPD-.0=IO) = &BD6TU(U0.MPD_OE_-=EN,
        U0.PDO-.0=A,U28.TN-=TN,U28.PI-.0=PI);
U29(PTST-=Z) = &B4RP(U29.A-=A);
U20(U20.Z-=Z,U20.PO-=PO) = &DRVT4U(U19.PO-=PI,RESET_-=A);
U19(U19.Z-=Z,U19.PO-=PO) = &DRVT8U(U18.PO-=PI,CP-=A);
U18(U18.Z-=Z,U18.PO-=PO) = &TLCHTU(U17.PO-=PI,YSCNIN-=A);
U17(U17.Z-=Z,U17.PO-=PO) = &TLCHTU(U16.PO-=PI,XSCNIN-=A);
U16(U16.Z-=Z,U16.PO-=PO) = &TLCHTU(U15.PO-=PI,TST-=A);
U15(U15.PO-=PO,U15.Z-=Z) = &TLCHTU(U14.PO-=PI,PXL_EN-=A);
U0(U0.BMYL-.4=BMYL.4,U0.BMYL-.3=BMYL.3,U0.BMYL-.2=BMYL.2,
        U0.BMYL-.1=BMYL.1,U0.BMYL-.0=BMYL.0,U0.REQ_O-=REQ_O,
        U0.CNVL-.12=CNVL.12,U0.CNVL-.11=CNVL.11,U0.CNVL-.10=CNVL.10,
        U0.CNVL-.9=CNVL.9,U0.CNVL-.8=CNVL.8,U0.CNVL-.7=CNVL.7,
        U0.CNVL-.6=CNVL.6,U0.CNVL-.5=CNVL.5,U0.CNVL-.4=CNVL.4,
        U0.CNVL-.3=CNVL.3,U0.CNVL-.2=CNVL.2,U0.CNVL-.1=CNVL.1,
        U0.CNVL-.0=CNVL.0,U0.YINT-=YINT,U0.YINTSND-=YINTSND,
```

```
       U0.REQ_I-=REQ_I,U0.STB_I-=STB_I,U0.MPD_OE_-=MPD_OE_,
       U0.PDO-.15=PDO.15,U0.PDO-.14=PDO.14,U0.PDO-.13=PDO.13,
       U0.PDO-.12=PDO.12,U0.PDO-.11=PDO.11,U0.PDO-.10=PDO.10,
       U0.PDO-.9=PDO.9,U0.PDO-.8=PDO.8,U0.PDO-.7=PDO.7,
       U0.PDO-.6=PDO.6,U0.PDO-.5=PDO.5,U0.PDO-.4=PDO.4,
       U0.PDO-.3=PDO.3,U0.PDO-.2=PDO.2,U0.PDO-.1=PDO.1,
       U0.PDO-.0=PDO.0,U0.CLRXCNT_-=CLRXCNT_) = SPTTOPV2(
       U30.Z-.2=COF_ADRIN.2,U30.Z-.1=COF_ADRIN.1,U30.Z-.0=COF_ADRIN.0,
       U31.Z-=INT_GT_1IN,U32.Z-=YDWN,U33.Z-=YUP,U1.Z-.7=RC0.7,
       U1.Z-.6=RC0.6,U1.Z-.5=RC0.5,U1.Z-.4=RC0.4,U1.Z-.3=RC0.3,
       U1.Z-.2=RC0.2,U1.Z-.1=RC0.1,U1.Z-.0=RC0.0,U2.Z-.7=RC1.7,
       U2.Z-.6=RC1.6,U2.Z-.5=RC1.5,U2.Z-.4=RC1.4,U2.Z-.3=RC1.3,
       U2.Z-.2=RC1.2,U2.Z-.1=RC1.1,U2.Z-.0=RC1.0,U21.Z-.7=RC2.7,
       U21.Z-.6=RC2.6,U21.Z-.5=RC2.5,U21.Z-.4=RC2.4,U21.Z-.3=RC2.3,
       U21.Z-.2=RC2.2,U21.Z-.1=RC2.1,U21.Z-.0=RC2.0,U3.Z-.7=RC3.7,
       U3.Z-.6=RC3.6,U3.Z-.5=RC3.5,U3.Z-.4=RC3.4,U3.Z-.3=RC3.3,
       U3.Z-.2=RC3.2,U3.Z-.1=RC3.1,U3.Z-.0=RC3.0,U4.Z-.7=RC4.7,
       U4.Z-.6=RC4.6,U4.Z-.5=RC4.5,U4.Z-.4=RC4.4,U4.Z-.3=RC4.3,
       U4.Z-.2=RC4.2,U4.Z-.1=RC4.1,U4.Z-.0=RC4.0,U6.Z-=STRT,
       U7.Z-=STOP,U8.Z-=WAIT,U9.Z-.7=MPA.7,U9.Z-.6=MPA.6,
       U9.Z-.5=MPA.5,U9.Z-.4=MPA.4,U9.Z-.3=MPA.3,U9.Z-.2=MPA.2,
       U9.Z-.1=MPA.1,U9.Z-.0=MPA.0,U10.Z-=ALE,U11.Z-=RD_,
       U12.Z-=WR_,U13.Z-=CS_,U14.Z-=RDY_I,U16.Z-=TST,U17.Z-=XSCNIN,
       U18.Z-=YSCNIN,U19.Z-=CP,U28.ZI-.15=PDI.15,U28.ZI-.14=PDI.14,
       U28.ZI-.13=PDI.13,U28.ZI-.12=PDI.12,U28.ZI-.11=PDI.11,
       U28.ZI-.10=PDI.10,U28.ZI-.9=PDI.9,U28.ZI-.8=PDI.8,
       U28.ZI-.7=PDI.7,U28.ZI-.6=PDI.6,U28.ZI-.5=PDI.5,
       U28.ZI-.4=PDI.4,U28.ZI-.3=PDI.3,U28.ZI-.2=PDI.2,
       U28.ZI-.1=PDI.1,U28.ZI-.0=PDI.0,U20.Z-=RESET_,U15.Z-=PXL_EN);
   U32(U32.PO-=PO,U32.Z-=Z) = &TLCHTU(YDWN-=A,U33.PO-=PI);

/* extractors ******************************/

   U30.PI-.0 = (U31.PO-);
   U30.PI-.1 = (M-0.1);
   U30.PI-.2 = (M-0.0);
   U30.PO-.0 = (M-0.1);
   U30.PO-.1 = (M-0.0);
   U30.PO-.2 = (M-1);
   U1.PI-.0 = (M-1);
   U1.PI-.1 = (M-2.6);
   U1.PI-.2 = (M-2.5);
   U1.PI-.3 = (M-2.4);
   U1.PI-.4 = (M-2.3);
   U1.PI-.5 = (M-2.2);
   U1.PI-.6 = (M-2.1);
   U1.PI-.7 = (M-2.0);
   U1.PO-.0 = (M-2.6);
   U1.PO-.1 = (M-2.5);
   U1.PO-.2 = (M-2.4);
   U1.PO-.3 = (M-2.3);
   U1.PO-.4 = (M-2.2);
   U1.PO-.5 = (M-2.1);
   U1.PO-.6 = (M-2.0);
   U1.PO-.7 = (M-3);
   U2.PI-.0 = (M-3);
   U2.PI-.1 = (M-4.6);
   U2.PI-.2 = (M-4.5);
   U2.PI-.3 = (M-4.4);
   U2.PI-.4 = (M-4.3);
   U2.PI-.5 = (M-4.2);
   U2.PI-.6 = (M-4.1);
   U2.PI-.7 = (M-4.0);
   U2.PO-.0 = (M-4.6);
   U2.PO-.1 = (M-4.5);
   U2.PO-.2 = (M-4.4);
   U2.PO-.3 = (M-4.3);
   U2.PO-.4 = (M-4.2);
   U2.PO-.5 = (M-4.1);
   U2.PO-.6 = (M-4.0);
   U2.PO-.7 = (M-5);
   U21.PI-.0 = (M-5);
   U21.PI-.1 = (M-6.6);
   U21.PI-.2 = (M-6.5);
   U21.PI-.3 = (M-6.4);
```

```
U21.PI-.4 = (M-6.3);
U21.PI-.5 = (M-6.2);
U21.PI-.6 = (M-6.1);
U21.PI-.7 = (M-6.0);
U21.PO-.0 = (M-6.6);
U21.PO-.1 = (M-6.5);
U21.PO-.2 = (M-6.4);
U21.PO-.3 = (M-6.3);
U21.PO-.4 = (M-6.2);
U21.PO-.5 = (M-6.1);
U21.PO-.6 = (M-6.0);
U21.PO-.7 = (M-7);
U3.PI-.0 = (M-7);
U3.PI-.1 = (M-8.6);
U3.PI-.2 = (M-8.5);
U3.PI-.3 = (M-8.4);
U3.PI-.4 = (M-8.3);
U3.PI-.5 = (M-8.2);
U3.PI-.6 = (M-8.1);
U3.PI-.7 = (M-8.0);
U3.PO-.0 = (M-8.6);
U3.PO-.1 = (M-8.5);
U3.PO-.2 = (M-8.4);
U3.PO-.3 = (M-8.3);
U3.PO-.4 = (M-8.2);
U3.PO-.5 = (M-8.1);
U3.PO-.6 = (M-8.0);
U3.PO-.7 = (M-9);
U4.PI-.0 = (M-9);
U4.PI-.1 = (M-10.6);
U4.PI-.2 = (M-10.5);
U4.PI-.3 = (M-10.4);
U4.PI-.4 = (M-10.3);
U4.PI-.5 = (M-10.2);
U4.PI-.6 = (M-10.1);
U4.PI-.7 = (M-10.0);
U4.PO-.0 = (M-10.6);
U4.PO-.1 = (M-10.5);
U4.PO-.2 = (M-10.4);
U4.PO-.3 = (M-10.3);
U4.PO-.4 = (M-10.2);
U4.PO-.5 = (M-10.1);
U4.PO-.6 = (M-10.0);
U4.PO-.7 = (U6.PI-);
U9.PI-.0 = (U8.PO-);
U9.PI-.1 = (M-11.6);
U9.PI-.2 = (M-11.5);
U9.PI-.3 = (M-11.4);
U9.PI-.4 = (M-11.3);
U9.PI-.5 = (M-11.2);
U9.PI-.6 = (M-11.1);
U9.PI-.7 = (M-11.0);
U9.PO-.0 = (M-11.6);
U9.PO-.1 = (M-11.5);
U9.PO-.2 = (M-11.4);
U9.PO-.3 = (M-11.3);
U9.PO-.4 = (M-11.2);
U9.PO-.5 = (M-11.1);
U9.PO-.6 = (M-11.0);
U9.PO-.7 = (U10.PI-);
U28.PO-.15 = (U29.A-);
U28.PO-.0 = (M-12.14);
U28.PO-.1 = (M-12.13);
U28.PO-.2 = (M-12.12);
U28.PO-.3 = (M-12.11);
U28.PO-.4 = (M-12.10);
U28.PO-.5 = (M-12.9);
U28.PO-.6 = (M-12.8);
U28.PO-.7 = (M-12.7);
U28.PO-.8 = (M-12.6);
U28.PO-.9 = (M-12.5);
U28.PO-.10 = (M-12.4);
U28.PO-.11 = (M-12.3);
U28.PO-.12 = (M-12.2);
U28.PO-.13 = (M-12.1);
U28.PO-.14 = (M-12.0);
```

```
    U28.PI-.1 = (M-12.14);
    U28.PI-.2 = (M-12.13);
    U28.PI-.3 = (M-12.12);
    U28.PI-.4 = (M-12.11);
    U28.PI-.5 = (M-12.10);
    U28.PI-.6 = (M-12.9);
    U28.PI-.7 = (M-12.8);
    U28.PI-.8 = (M-12.7);
    U28.PI-.9 = (M-12.6);
    U28.PI-.10 = (M-12.5);
    U28.PI-.11 = (M-12.4);
    U28.PI-.12 = (M-12.3);
    U28.PI-.13 = (M-12.2);
    U28.PI-.14 = (M-12.1);
    U28.PI-.15 = (M-12.0);
    U28.PI-.0 = (U20.PO-);

  /* type converters *********************/

ANNOTATIONS
{
  BUS BUS_TYPE = "DOT";
}

END MODULE;


/* * * * * * *  Contents of NET file PADECV1.NET  * * * * * * */

/* Generated by SYN Version 0.96 */


MODULE PADECV1;
INPUTS
    MPA7, MPA6, MPA5, MPA4,
    MPA3, MPA2, MPA1, MPA0,
    RD_, CS_;
OUTPUTS
    XDIM_CS_, YDIM_CS_, XAU_HCS_, XAU_LCS_,
    YAU_HCS_, YAU_LCS_, MR_CS_, CMEM_CS_,
    PLR_CS_, SEL00, SEL01, SEL10,
    SEL11, U26, U20, U21,
```

```
    U12, CNVL, SW0, MPD_OE;
DEFINE
    W29 = (MPA7);
    W57 = (MPA6);
    W52 = (MPA5);
    W47 = (MPA4);
    W46 = (MPA3);
    W45 = (MPA2);
    W43 = (MPA1);
    W42 = (MPA0);
    W41 = (RD_);
    W39 = (CS_);
    XDIM_CS_ = (W38);
    YDIM_CS_ = (W35);
    XAU_HCS_ = (W34);
    XAU_LCS_ = (W33);
    YAU_HCS_ = (W25);
    YAU_LCS_ = (W23);
    MR_CS_ = (W22);
    CMEM_CS_ = (W21);
    PLR_CS_ = (W19);
    SEL00 = (W18);
    SEL01 = (W17);
    SEL10 = (W16);
    SEL11 = (W14);
```

```
U26 = (W13);
U20 = (W11);
U21 = (W10);
U12 = (W9);
CNVL = (W8);
SW0 = (W7);
MPD_OE = (W6);
M3(W5) =
  N1B(W29);
M4(W69) =
  N1B(W41);
M5(W68) =
  N1C(W39);
M6(W67) =
  ND3B(W5, W69, W68);
M7(W66) =
  N1B(W57);
M8(W65) =
  N1B(W52);
M9(W64) =
  AND3C(W29, W66, W65);
M10(W63) =
  N1C(W47);
M11(W62) =
  AND3B(W63, W46, W45);
M12(W61) =
  N1B(W43);
M13(W60) =
  N1C(W42);
M14(W59) =
  AND3B(W61, W60, W68);
M15(W58) =
  ND3B(W64, W62, W59);
M17(W56) =
  N1B(W46);
M18(W55) =
  AND3B(W63, W56, W45);
M19(W54) =
  AND3B(W43, W42, W68);
```

L5A1358.NET Thu Dec 20 09:25:10 1990 105

```
M20(W53) =
  ND3B(W64, W55, W54);
M22(W51) =
  N1B(W45);
M23(W50) =
  AND3C(W63, W46, W51);
M24(W49) =
  AND3B(W61, W42, W68);
M25(W48) =
  ND3B(W64, W50, W49);
M29(W44) =
  ND3B(W64, W62, W49);
M33(W40) =
  ND3B(W64, W50, W59);
M36(W37) =
  AND3B(W43, W60, W68);
M37(W36) =
  ND3B(W64, W50, W37);
M41(W32) =
  ND3C(W64, W50, W54);
M42(W31) =
  ND2B(W29, W43);
M43(W30) =
  ND2B(W29, W61);
M45(W28) =
  AND3C(W68, W29, W56);
M46(W27) =
  AND3B(W60, W51, W63);
M47(W26) =
  AND3C(W65, W66, W31);
M48(W38) =
  ND3B(W28, W27, W26);
```

```
    M50(W24) =
      AND3B(W51, W42, W63);
    M52(W35) =
      ND3B(W28, W24, W26);
    M55(W20) =
      AND3C(W65, W66, W30);
    M56(W34) =
      ND3B(W28, W27, W20);
    M60(W33) =
      ND3B(W28, W24, W20);
    M62(W15) =
      AND3B(W45, W60, W63);
    M64(W25) =
      ND3B(W28, W15, W26);
    M66(W12) =
      AND3B(W45, W42, W63);
    M68(W23) =
      ND3B(W28, W12, W26);
    M72(W22) =
      ND3B(W28, W12, W20);
    M73(W21) =
      ND3B(W68, W31, W30);
    M77(W19) =
      ND3B(W28, W15, W20);
    M78(W4) =
      AND2B(W53, W48);
    M79(W3) =
      AND2B(W40, W36);
    M80(W18) =
      ND3B(W4, W3, W32);
    M81(W17) =
      ND2B(W53, W44);
```

```
    M82(W16) =
      ND2B(W40, W32);
    M83(W14) =
      ND2B(W36, W32);
    M84(W13) =
      N1B(W40);
    M85(W11) =
      N1B(W48);
    M86(W10) =
      N1B(W36);
    M87(W9) =
      N1B(W32);
    M88(W8) =
      N1B(W58);
    M89(W7) =
      N1B(W44);
    M90(W6) =
      N1B(W67);
END MODULE;


/* * * * * * * Contents of NET file ADD8F_SEL4.NET * * * * * * */

/*****************************************************/
/*  Netlist copyright (C) 1989 LSI Logic Corporation  */
/*****************************************************/

MODULE ADD8F_SEL4;

INPUTS       A0,A1,A2,A3,B0,B1,B2,B3,CI;
OUTPUTS      G,P,SUM0,SUM1,SUM2,SUM3;

LEVEL FUNCTION;
DEFINE
  /* implicit connectors *******************/
```

```
P- = (P);
SUM3- = (SUM3);
A2- = (A2);
B2- = (B2);
G- = (G);
B3- = (B3);
A3- = (A3);
A1- = (A1);
B1- = (B1);
SUM1- = (SUM1);
CI- = (CI);
SUM2- = (SUM2);
A0- = (A0);
B0- = (B0);
SUM0- = (SUM0);

/* part instances **************************/

U28(U28.Z-=Z) = N1C(U18.Z-=A);
U30(U30.Z-=Z) = ENB(U11.Z-=A,U25.Z-=B);
U40(P-=Z) = AND2B(U19.Z-=B,U3.Z-=A);
U26(U26.Z-=Z) = EOB(U9.Z-=A,U16.Z-=B);
U37(U37.Z-=Z) = MX21LA(U15.Z-=S,U27.Z-=B,U26.Z-=A);
U39(SUM3-=Z) = MX21LB(U36.Z-=A,U37.Z-=B,U29.Z-=S);
U36(U36.Z-=Z) = MX21LA(U27.Z-=B,U26.Z-=A,U4.Z-=S);
```

```
U27(U27.Z-=Z) = ENB(U16.Z-=A,U10.Z-=B);
U35(U35.Z-=Z) = MX21LA(U15.Z-=S,U24.Z-=A,U14.Z-=B);
U24(U24.Z-=Z) = N1B(U14.Z-=A);
U14(U14.Z-=Z) = ND2B(U10.Z-=B,U9.Z-=A);
U10(U10.Z-=Z) = N1B(U7.Z-=A);
U7(U7.Z-=Z) = NR2C(B2-=B,A2-=A);
U9(U9.Z-=Z) = ND2C(A2-=A,B2-=B);
U23(G-=Z) = ND2C(U21.Z-=B,U22.Z-=A);
U21(U21.Z-=Z) = N1C(U20.Z-=A);
U20(U20.Z-=Z) = AO7A(U8.Z-=B,U9.Z-=A,U13.Z-=C);
U8(U8.Z-=Z) = NR2C(B3-=B,A3-=A);
U13(U13.Z-=Z) = ND2C(A3-=A,B3-=B);
U16(U16.Z-=Z) = ND2C(U13.Z-=A,U17.Z-=B);
U17(U17.Z-=Z) = N1B(U8.Z-=A);
U19(U19.Z-=Z) = NR2C(U7.Z-=A,U8.Z-=B);
U22(U22.Z-=Z) = ND2B(U15.Z-=B,U19.Z-=A);
U15(U15.Z-=Z) = AO7B(U11.Z-=A,U5.Z-=B,U12.Z-=C);
U2(U2.Z-=Z) = N1B(U5.Z-=A);
U5(U5.Z-=Z) = NR2C(B1-=B,A1-=A);
U12(U12.Z-=Z) = ND2C(A1-=A,B1-=B);
U25(U25.Z-=Z) = ND2B(U2.Z-=B,U12.Z-=A);
U1(U1.Z-=Z) = N1B(U0.Z-=A);
U31(U31.Z-=Z) = EOB(U25.Z-=A,U1.Z-=B);
U34(SUM1-=Z) = MX21LB(U30.Z-=B,U31.Z-=A,U29.Z-=S);
U29(U29.Z-=Z) = N1D(CI-=A);
U38(SUM2-=Z) = MX21LB(U35.Z-=B,U32.Z-=A,U29.Z-=S);
U32(U32.Z-=Z) = MX21LA(U24.Z-=A,U14.Z-=B,U4.Z-=S);
U4(U4.Z-=Z) = ND2C(U12.Z-=A,U6.Z-=B);
U6(U6.Z-=Z) = N1C(U3.Z-=A);
U3(U3.Z-=Z) = NR2C(U0.Z-=B,U5.Z-=A);
U0(U0.Z-=Z) = NR2C(B0-=B,A0-=A);
U11(U11.Z-=Z) = ND2C(A0-=A,B0-=B);
U18(U18.Z-=Z) = ND2B(U1.Z-=B,U11.Z-=A);
U33(SUM0-=Z) = MX21LB(U28.Z-=A,U29.Z-=S,U18.Z-=B);

/* extractors ******************************/


/* type converters *********************/

ANNOTATIONS
{
```

```
  BUS BUS_TYPE = "DOT";
}

END MODULE;


/* * * * * * *  Contents of NET file FRMLV2.NET  * * * * * * */

/*******************************************************/
/*  Netlist copyright (C) 1989 LSI Logic Corporation  */
/*******************************************************/


MODULE FRMLV2;

INPUTS      CP,CT.7,CT.6,CT.5,CT.4,CT.3,CT.2,CT.1,CT.0,LWS.7,
            LWS.6,LWS.5,LWS.4,LWS.3,LWS.2,LWS.1,LWS.0,RESET_,SC.7,
            SC.6,SC.5,SC.4,SC.3,SC.2,SC.1,SC.0,WAIT;
OUTPUTS     Z.7,Z.6,Z.5,Z.4,Z.3,Z.2,Z.1,Z.0;
```

```
LEVEL FUNCTION;
DEFINE
  /* implicit connectors *******************/

    Z-.7 = (Z.7);
    Z-.6 = (Z.6);
    Z-.5 = (Z.5);
    Z-.4 = (Z.4);
    Z-.3 = (Z.3);
    Z-.2 = (Z.2);
    Z-.1 = (Z.1);
    Z-.0 = (Z.0);
    CT-.7 = (CT.7);
    CT-.6 = (CT.6);
    CT-.5 = (CT.5);
    CT-.4 = (CT.4);
    CT-.3 = (CT.3);
    CT-.2 = (CT.2);
    CT-.1 = (CT.1);
    CT-.0 = (CT.0);
    SC-.7 = (SC.7);
    SC-.6 = (SC.6);
    SC-.5 = (SC.5);
    SC-.4 = (SC.4);
    SC-.3 = (SC.3);
    SC-.2 = (SC.2);
    SC-.1 = (SC.1);
    SC-.0 = (SC.0);
    LWS-.7 = (LWS.7);
    LWS-.6 = (LWS.6);
    LWS-.5 = (LWS.5);
    LWS-.4 = (LWS.4);
    LWS-.3 = (LWS.3);
    LWS-.2 = (LWS.2);
    LWS-.1 = (LWS.1);
    LWS-.0 = (LWS.0);
    U5.CI- = (NC/0/);
    U4.TCX- = (NC/0/);
    U4.TCYN- = (NC/1/);
    CP- = (CP);
    CP- = (CP);
    BRESET_- = (BRESET_);
    WAIT- = (WAIT);
    WAIT- = (WAIT);
    BRESET_- = (BRESET_);
    BRESET_- = (BRESET_);
    RESET_- = (RESET_);
```

```
/* part instances *************************/

  U5(U5.S-.7=S.7,U5.S-.6=S.6,U5.S-.5=S.5,U5.S-.4=S.4,U5.S-.3=S.3,
        U5.S-.2=S.2,U5.S-.1=S.1,U5.S-.0=S.0) = ADD8F(U5.B-.7=B.7,
        U5.B-.6=B.6,U5.B-.5=B.5,U5.B-.4=B.4,U5.B-.3=B.3,
        U5.B-.2=B.2,U5.B-.1=B.1,U5.B-.0=B.0,U5.CI-=CI,U5.A-.7=A.7,
        U5.A-.6=A.6,U5.A-.5=A.5,U5.A-.4=A.4,U5.A-.3=A.3,
        U5.A-.2=A.2,U5.A-.1=A.1,U5.A-.0=A.0);
  U4(U4.S-.16=S.16,U4.S-.15=S.15,U4.S-.14=S.14,U4.S-.13=S.13,
        U4.S-.12=S.12,U4.S-.11=S.11,U4.S-.10=S.10,U4.S-.9=S.9,
        U4.S-.8=S.8,U4.S-.7=S.7,U4.S-.6=S.6,U4.S-.5=S.5,
        U4.S-.4=S.4,U4.S-.3=S.3,U4.S-.2=S.2,U4.S-.1=S.1,
        U4.S-.0=S.0) = DMB2001B(U4.TCX-=TCX,U4.TCYN-=TCYN,
        U4.X-.7=X.7,U4.X-.6=X.6,U4.X-.5=X.5,U4.X-.4=X.4,
```

```
        U4.X-.3=X.3,U4.X-.2=X.2,U4.X-.1=X.1,U4.X-.0=X.0,
        U4.Y-.7=Y.7,U4.Y-.6=Y.6,U4.Y-.5=Y.5,U4.Y-.4=Y.4,
        U4.Y-.3=Y.3,U4.Y-.2=Y.2,U4.Y-.1=Y.1,U4.Y-.0=Y.0);
   U0.2.7(U0.Q-.2.7=Q) = FD2SA(U0.D-.2.7=D,U0.Q-.2.7=TI,CP-=CP,
        BRESET_-=CD,WAIT-=TE);
   U0.2.6(U0.Q-.2.6=Q) = FD2SA(U0.D-.2.6=D,U0.Q-.2.6=TI,CP-=CP,
        BRESET_-=CD,WAIT-=TE);
   U0.2.5(U0.Q-.2.5=Q) = FD2SA(U0.D-.2.5=D,U0.Q-.2.5=TI,CP-=CP,
        BRESET_-=CD,WAIT-=TE);
   U0.2.4(U0.Q-.2.4=Q) = FD2SA(U0.D-.2.4=D,U0.Q-.2.4=TI,CP-=CP,
        BRESET_-=CD,WAIT-=TE);
   U0.2.3(U0.Q-.2.3=Q) = FD2SA(U0.D-.2.3=D,U0.Q-.2.3=TI,CP-=CP,
        BRESET_-=CD,WAIT-=TE);
   U0.2.2(U0.Q-.2.2=Q) = FD2SA(U0.D-.2.2=D,U0.Q-.2.2=TI,CP-=CP,
        BRESET_-=CD,WAIT-=TE);
   U0.2.1(U0.Q-.2.1=Q) = FD2SA(U0.D-.2.1=D,U0.Q-.2.1=TI,CP-=CP,
        BRESET_-=CD,WAIT-=TE);
   U0.2.0(U0.Q-.2.0=Q) = FD2SA(U0.D-.2.0=D,U0.Q-.2.0=TI,CP-=CP,
        BRESET_-=CD,WAIT-=TE);
   U0.1.7(U0.Q-.1.7=Q) = FD2SA(U0.D-.1.7=D,U0.Q-.1.7=TI,CP-=CP,
        BRESET_-=CD,WAIT-=TE);
   U0.1.6(U0.Q-.1.6=Q) = FD2SA(U0.D-.1.6=D,U0.Q-.1.6=TI,CP-=CP,
        BRESET_-=CD,WAIT-=TE);
   U0.1.5(U0.Q-.1.5=Q) = FD2SA(U0.D-.1.5=D,U0.Q-.1.5=TI,CP-=CP,
        BRESET_-=CD,WAIT-=TE);
   U0.1.4(U0.Q-.1.4=Q) = FD2SA(U0.D-.1.4=D,U0.Q-.1.4=TI,CP-=CP,
        BRESET_-=CD,WAIT-=TE);
   U0.1.3(U0.Q-.1.3=Q) = FD2SA(U0.D-.1.3=D,U0.Q-.1.3=TI,CP-=CP,
        BRESET_-=CD,WAIT-=TE);
   U0.1.2(U0.Q-.1.2=Q) = FD2SA(U0.D-.1.2=D,U0.Q-.1.2=TI,CP-=CP,
        BRESET_-=CD,WAIT-=TE);
   U0.1.1(U0.Q-.1.1=Q) = FD2SA(U0.D-.1.1=D,U0.Q-.1.1=TI,CP-=CP,
        BRESET_-=CD,WAIT-=TE);
   U0.1.0(U0.Q-.1.0=Q) = FD2SA(U0.D-.1.0=D,U0.Q-.1.0=TI,CP-=CP,
        BRESET_-=CD,WAIT-=TE);
   U0.0.7(U0.Q-.0.7=Q) = FD2SA(U0.D-.0.7=D,U0.Q-.0.7=TI,CP-=CP,
        BRESET_-=CD,WAIT-=TE);
   U0.0.6(U0.Q-.0.6=Q) = FD2SA(U0.D-.0.6=D,U0.Q-.0.6=TI,CP-=CP,
        BRESET_-=CD,WAIT-=TE);
   U0.0.5(U0.Q-.0.5=Q) = FD2SA(U0.D-.0.5=D,U0.Q-.0.5=TI,CP-=CP,
        BRESET_-=CD,WAIT-=TE);
   U0.0.4(U0.Q-.0.4=Q) = FD2SA(U0.D-.0.4=D,U0.Q-.0.4=TI,CP-=CP,
        BRESET_-=CD,WAIT-=TE);
   U0.0.3(U0.Q-.0.3=Q) = FD2SA(U0.D-.0.3=D,U0.Q-.0.3=TI,CP-=CP,
        BRESET_-=CD,WAIT-=TE);
   U0.0.2(U0.Q-.0.2=Q) = FD2SA(U0.D-.0.2=D,U0.Q-.0.2=TI,CP-=CP,
        BRESET_-=CD,WAIT-=TE);
   U0.0.1(U0.Q-.0.1=Q) = FD2SA(U0.D-.0.1=D,U0.Q-.0.1=TI,CP-=CP,
        BRESET_-=CD,WAIT-=TE);
   U0.0.0(U0.Q-.0.0=Q) = FD2SA(U0.D-.0.0=D,U0.Q-.0.0=TI,CP-=CP,
        BRESET_-=CD,WAIT-=TE);
   U6.7(Z-.7=Q) = FD2SA(Z-.7=TI,CP-=CP,U5.S-.7=D,BRESET_-=CD,WAIT-=TE);
   U6.6(Z-.6=Q) = FD2SA(Z-.6=TI,CP-=CP,U5.S-.6=D,BRESET_-=CD,WAIT-=TE);
   U6.5(Z-.5=Q) = FD2SA(Z-.5=TI,CP-=CP,U5.S-.5=D,BRESET_-=CD,WAIT-=TE);
   U6.4(Z-.4=Q) = FD2SA(Z-.4=TI,CP-=CP,U5.S-.4=D,BRESET_-=CD,WAIT-=TE);
   U6.3(Z-.3=Q) = FD2SA(Z-.3=TI,CP-=CP,U5.S-.3=D,BRESET_-=CD,WAIT-=TE);
```

```
U6.2(Z-.2=Q) = FD2SA(Z-.2=TI,CP-=CP,U5.S-.2=D,BRESET_-=CD,WAIT-=TE);
U6.1(Z-.1=Q) = FD2SA(Z-.1=TI,CP-=CP,U5.S-.1=D,BRESET_-=CD,WAIT-=TE);
U6.0(Z-.0=Q) = FD2SA(Z-.0=TI,CP-=CP,U5.S-.0=D,BRESET_-=CD,WAIT-=TE);
U3(BRESET_-=Z) = B3A(RESET_-=A);


/* extractors ******************************/
```

```
U0.D-.2.7 = (CT-.7);
U0.D-.2.6 = (CT-.6);
U0.D-.2.5 = (CT-.5);
U0.D-.2.4 = (CT-.4);
U0.D-.2.3 = (CT-.3);
U0.D-.2.2 = (CT-.2);
U0.D-.2.1 = (CT-.1);
U0.D-.2.0 = (CT-.0);
U0.D-.1.7 = (SC-.7);
U0.D-.1.6 = (SC-.6);
U0.D-.1.5 = (SC-.5);
U0.D-.1.4 = (SC-.4);
U0.D-.1.3 = (SC-.3);
U0.D-.1.2 = (SC-.2);
U0.D-.1.1 = (SC-.1);
U0.D-.1.0 = (SC-.0);
U0.D-.0.7 = (LWS-.7);
U0.D-.0.6 = (LWS-.6);
U0.D-.0.5 = (LWS-.5);
U0.D-.0.4 = (LWS-.4);
U0.D-.0.3 = (LWS-.3);
U0.D-.0.2 = (LWS-.2);
U0.D-.0.1 = (LWS-.1);
U0.D-.0.0 = (LWS-.0);
U4.S-.15 = (U5.B-.7);
U4.S-.14 = (U5.B-.6);
U4.S-.13 = (U5.B-.5);
U4.S-.12 = (U5.B-.4);
U4.S-.11 = (U5.B-.3);
U4.S-.10 = (U5.B-.2);
U4.S-.9 = (U5.B-.1);
U4.S-.8 = (U5.B-.0);
U0.Q-.0.7 = (U5.A-.7);
U0.Q-.0.6 = (U5.A-.6);
U0.Q-.0.5 = (U5.A-.5);
U0.Q-.0.4 = (U5.A-.4);
U0.Q-.0.3 = (U5.A-.3);
U0.Q-.0.2 = (U5.A-.2);
U0.Q-.0.1 = (U5.A-.1);
U0.Q-.0.0 = (U5.A-.0);
U0.Q-.1.7 = (U4.X-.7);
U0.Q-.1.6 = (U4.X-.6);
U0.Q-.1.5 = (U4.X-.5);
U0.Q-.1.4 = (U4.X-.4);
U0.Q-.1.3 = (U4.X-.3);
U0.Q-.1.2 = (U4.X-.2);
U0.Q-.1.1 = (U4.X-.1);
U0.Q-.1.0 = (U4.X-.0);
U0.Q-.2.7 = (U4.Y-.7);
U0.Q-.2.6 = (U4.Y-.6);
U0.Q-.2.5 = (U4.Y-.5);
U0.Q-.2.4 = (U4.Y-.4);
U0.Q-.2.3 = (U4.Y-.3);
U0.Q-.2.2 = (U4.Y-.2);
U0.Q-.2.1 = (U4.Y-.1);
U0.Q-.2.0 = (U4.Y-.0);


/* type converters *********************/

ANNOTATIONS
{
```

```
  BUS BUS_TYPE = "DOT";
}

L5A1358.NET        Thu Dec 20 09:25:10 1990        111

END MODULE;


/* * * * * * *  Contents of NET file ADD8F.NET  * * * * * * */

/*****************************************************/
/*  Netlist copyright (C) 1989 LSI Logic Corporation  */
/*****************************************************/


MODULE ADD8F;

INPUTS       A.7,A.6,A.5,A.4,A.3,A.2,A.1,A.0,B.7,B.6,B.5,B.4,B.3,
             B.2,B.1,B.0,CI;
OUTPUTS      S.7,S.6,S.5,S.4,S.3,S.2,S.1,S.0;

LEVEL FUNCTION;
DEFINE
  /* implicit connectors *******************/

    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    CI- = (CI);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);


  /* part instances *************************/

    U4(U4.Z-=Z) = N1D(U3.Z-=A);
    U3(U3.Z-=Z) = AO6B(CI-=A,U0.G-=C,U0.P-=B);
    U0(U0.G-=G,U0.P-=P,U0.SUM0-=SUM0,U0.SUM1-=SUM1,U0.SUM2-=SUM2,
         U0.SUM3-=SUM3) = ADD8F_SEL4(CI-=CI,U0.A0-=A0,U0.A1-=A1,
         U0.A2-=A2,U0.A3-=A3,U0.B0-=B0,U0.B1-=B1,U0.B2-=B2,
         U0.B3-=B3);
    U8(U8.Z-=Z) = ND3C(CI-=A,U1.P-=C,U0.P-=B);
    U5(U5.Z-=Z) = ND2C(U2.Z-=A,U8.Z-=B);
    U2(U2.Z-=Z) = AO6B(U0.G-=A,U1.P-=B,U1.G-=C);
    U6(U6.Z-=Z) = AO6B(U5.Z-=A,U1.P-=B,U1.G-=C);
    U7(U7.Z-=Z) = N1C(U6.Z-=A);
    U1(U1.P-=P,U1.G-=G,U1.SUM0-=SUM0,U1.SUM1-=SUM1,U1.SUM3-=SUM3,
         U1.SUM2-=SUM2) = ADD8F_SEL4(U1.A1-=A1,U1.A0-=A0,U1.A2-=A2,
```

```
            U1.A3--A3,U1.B0--B0,U4.Z--CI,U1.B1--B1,U1.B3--B3,
            U1.B2--B2);

  /* extractors ******************************/

    B-.4 = (U1.B0-);
    B-.5 = (U1.B1-);
    M-1.7 = (U1.SUM3-);
    M-1.5 = (U1.SUM1-);
    A-.0 = (U0.A0-);
    A-.6 = (U1.A2-);
    A-.4 = (U1.A0-);
    A-.2 = (U0.A2-);
    A-.5 = (U1.A1-);
    A-.1 = (U0.A1-);
    A-.7 = (U1.A3-);
    A-.3 = (U0.A3-);
    M-1.0 = (U0.SUM0-);
    B-.0 = (U0.B0-);
    M-1.1 = (U0.SUM1-);
    B-.1 = (U0.B1-);
    M-1.2 = (U0.SUM2-);
    B-.2 = (U0.B2-);
    M-1.3 = (U0.SUM3-);
    B-.3 = (U0.B3-);
    S-.7 = (U7.Z-);
    S-.6 = (M-0.6);
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    M-1.7 = (M-0.6);
    M-1.6 = (M-0.5);
    M-1.5 = (M-0.4);
    M-1.4 = (M-0.3);
    M-1.3 = (M-0.2);
    M-1.2 = (M-0.1);
    M-1.1 = (M-0.0);
    M-1.4 = (U1.SUM0-);
    M-1.6 = (U1.SUM2-);
    B-.6 = (U1.B2-);
    B-.7 = (U1.B3-);

  /* type converters *********************/

ANNOTATIONS
{
  BUS BUS_TYPE = "DOT";
}

END MODULE;


/* * * * * * *  Contents of NET file OSSV1CR.NET  * * * * * * */

/*****************************************************/
/*  Netlist copyright (C) 1989 LSI Logic Corporation  */
/*****************************************************/
```

```
MODULE OSSV1CR;

INPUTS      EN,NS0,NS1,STBIT0I,STBIT1I,WAIT;
OUTPUTS     LS_1,SPR0,SPR1,STBIT0O,STBIT1O;
```

```
LEVEL FUNCTION;
DEFINE
  /* implicit connectors *****************/

    NS0- = (NS0);
    STBIT0O- = (STBIT0O);
    STBIT1I- = (STBIT1I);
    SPR1- = (SPR1);
    EN- = (EN);
    STBIT0I- = (STBIT0I);
    WAIT- = (WAIT);
    STBIT1O- = (STBIT1O);
    LS_1- = (LS_1);
    NS1- = (NS1);
    SPR0- = (SPR0);


  /* part instances *************************/

    M3(M3.Z-=Z) = N1C(STBIT1I-=A);
    M19(M19.Z-=Z) = N1B(NS0-=A);
    M29(M29.Z-=Z) = ND4B(M3.Z-=D,M28.Z-=B,M19.Z-=A,M7.Z-=C);
    M34(M34.Z-=Z) = ND4B(M31.Z-=D,STBIT0I-=C,NS0-=A,NS1-=B);
    M2(M2.Z-=Z) = ND3B(M3.Z-=C,STBIT0I-=B,NS1-=A);
    M42(SPR1-=Z) = ND4B(M16.Z-=C,M34.Z-=D,M2.Z-=A,M14.Z-=B);
    M16(M16.Z-=Z) = ND2B(M15.Z-=A,STBIT0I-=B);
    M9(M9.Z-=Z) = ND3B(M3.Z-=C,M8.Z-=B,M1.Z-=A);
    M8(M8.Z-=Z) = AND2B(M7.Z-=B,M6.Z-=A);
    M26(M26.Z-=Z) = ND3B(M31.Z-=C,M8.Z-=B,M1.Z-=A);
    M1(M1.Z-=Z) = AND2B(NS1-=A,EN-=B);
    M15(M15.Z-=Z) = N1B(EN-=A);
    M17(M17.Z-=Z) = ND2B(M31.Z-=B,M15.Z-=A);
    M27(M27.Z-=Z) = ND2B(M31.Z-=B,WAIT-=A);
    M31(M31.Z-=Z) = N1C(M3.Z-=A);
    M22(M22.Z-=Z) = AND2B(M7.Z-=A,M31.Z-=B);
    M7(M7.Z-=Z) = N1C(STBIT0I-=A);
    M10(M10.Z-=Z) = AND2B(NS1-=B,NS0-=A);
    M13(M13.Z-=Z) = ND3B(M11.Z-=B,M12.Z-=C,M10.Z-=A);
    M12(M12.Z-=Z) = AND2B(STBIT0I-=A,M3.Z-=B);
    M32(M32.Z-=Z) = AND2B(M7.Z-=A,M3.Z-=B);
    M33(M33.Z-=Z) = ND3B(M11.Z-=B,M32.Z-=C,M30.Z-=A);
    M11(M11.Z-=Z) = AND2B(EN-=A,M6.Z-=B);
    M6(M6.Z-=Z) = N1B(WAIT-=A);
    M14(M14.Z-=Z) = ND2B(STBIT0I-=B,WAIT-=A);
    M38(STBIT0O-=Z) = ND4B(M16.Z-=C,M13.Z-=A,M14.Z-=B,M26.Z-=D);
    M40(M40.Z-=Z) = AND2B(M26.Z-=A,M27.Z-=B);
    M36(M36.Z-=Z) = AND2B(M17.Z-=A,M27.Z-=B);
    M37(STBIT1O-=Z) = ND3B(M33.Z-=C,M36.Z-=B,M35.Z-=A);
    M35(M35.Z-=Z) = AND2B(M9.Z-=A,M13.Z-=B);
    M43(LS_1-=Z) = ND4B(M33.Z-=D,M29.Z-=C,M23.Z-=B,M13.Z-=A);
    M23(M23.Z-=Z) = ND3B(M11.Z-=B,M22.Z-=C,M20.Z-=A);
    M20(M20.Z-=Z) = AND2B(NS1-=B,M19.Z-=A);
    M28(M28.Z-=Z) = N1B(NS1-=A);
    M30(M30.Z-=Z) = AND2B(NS0-=A,M28.Z-=B);
    M18(M18.Z-=Z) = ND3B(M31.Z-=C,M7.Z-=B,NS0-=A);
    M39(M39.Z-=Z) = AND2B(M17.Z-=A,M18.Z-=B);
    M41(SPR0-=Z) = ND3B(M40.Z-=B,M34.Z-=C,M39.Z-=A);
```

```
  /* extractors ******************************/


  /* type converters *********************/

ANNOTATIONS
{
  BUS BUS_TYPE = "DOT";
}

END MODULE;
```

```
/* * * * * * *  Contents of NET file OSSV1FN.NET  * * * * * * */

/*******************************************************/
/*  Netlist copyright (C) 1989 LSI Logic Corporation  */
/*******************************************************/


MODULE OSSV1FN;

INPUTS      CP,EN,NS.1,NS.0,RESET_,WAIT;
OUTPUTS     LS_1,SPR.1,SPR.0;

LEVEL FUNCTION;
DEFINE
  /* implicit connectors *******************/

    CP- = (CP);
    CP- = (CP);
    RESET_- = (RESET_);
    RESET_- = (RESET_);
    EN- = (EN);
    NS-.1 = (NS.1);
    NS-.0 = (NS.0);
    WAIT- = (WAIT);
    SPR-.1 = (SPR.1);
    SPR-.0 = (SPR.0);
    LS_1- = (LS_1);


  /* part instances **************************/

    U4.1(U4.Q-.1=Q) = FD2A(U4.D-.1=D,CP-=CP,RESET_-=CD);
    U4.0(U4.Q-.0=Q) = FD2A(U4.D-.0=D,CP-=CP,RESET_-=CD);
    U0(U0.STBIT1O-=STBIT1O,U0.STBIT0O-=STBIT0O,U0.LS_1-=LS_1,
            U0.SPR0-=SPR0,U0.SPR1-=SPR1) = OSSV1CR(U0.STBIT1I-=STBIT1I,
            U0.STBIT0I-=STBIT0I,EN-=EN,U0.NS0-=NS0,U0.NS1-=NS1,
            WAIT-=WAIT);
    U2.2(U2.Q-.2=Q) = FD2A(CP-=CP,RESET_-=CD,U2.D-.2=D);
    U2.1(U2.Q-.1=Q) = FD2A(CP-=CP,RESET_-=CD,U2.D-.1=D);
    U2.0(U2.Q-.0=Q) = FD2A(CP-=CP,RESET_-=CD,U2.D-.0=D);


  /* extractors *****************************/

    U2.D-.0 = (U0.LS_1-);
    U2.D-.1 = (U0.SPR0-);
    U4.D-.0 = (U0.STBIT0O-);
    U4.D-.1 = (U0.STBIT1O-);
```

```
    U4.Q-.1 = (U0.STBIT1I-);
    U4.Q-.0 = (U0.STBIT0I-);
    NS-.0 = (U0.NS0-);
    NS-.1 = (U0.NS1-);
    U2.D-.2 = (U0.SPR1-);
    U2.Q-.2 = (SPR-.1);
    U2.Q-.1 = (SPR-.0);
    U2.Q-.0 = (LS_1-);


  /* type converters *********************/

ANNOTATIONS
{
  BUS BUS_TYPE = "DOT";
}

END MODULE;


/* * * * * * *  Contents of NET file CNTR8D.NET  * * * * * * */
```

```
/*****************************************************/
/*  Netlist copyright (C) 1989 LSI Logic Corporation  */
/*****************************************************/


MODULE CNTR8D;

INPUTS      CE,CP,D.7,D.6,D.5,D.4,D.3,D.2,D.1,D.0,LD,RESET_;
OUTPUTS     CO,Q.7,Q.6,Q.5,Q.4,Q.3,Q.2,Q.1,Q.0;

LEVEL FUNCTION;
DEFINE
  /* implicit connectors ******************/

    CE- = (CE);
    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    RESET_- = (RESET_);
    CP- = (CP);
    LD- = (LD);
    CO- = (CO);


  /* part instances *************************/

    M___10(M___10.Z-=Z) = N1C(CE-=A);
    U0(U0.Z-=Z) = B3A(RESET_-=A);
```

```
    M___3(M___3.Q-=Q) = FD2SA(U0.Z-=CD,CP-=CP,M___3.D-=D,LD-=TE,
            M___3.TI-=TI);
    M___6(M___6.Q-=Q) = FD2SA(U0.Z-=CD,CP-=CP,M___6.D-=D,LD-=TE,
            M___6.TI-=TI);
    M___8(M___8.Q-=Q) = FD2SA(U0.Z-=CD,CP-=CP,M___8.D-=D,LD-=TE,
            M___8.TI-=TI);
    M___5(M___5.Q-=Q) = FD2SA(U0.Z-=CD,CP-=CP,M___5.D-=D,LD-=TE,
            M___5.TI-=TI);
    M___4(M___4.Q-=Q) = FD2SA(U0.Z-=CD,CP-=CP,M___4.D-=D,LD-=TE,
            M___4.TI-=TI);
    M___2(M___2.Q-=Q) = FD2SA(U0.Z-=CD,CP-=CP,M___2.D-=D,LD-=TE,
            M___2.TI-=TI);
    M___7(M___7.Q-=Q) = FD2SA(U0.Z-=CD,CP-=CP,M___7.D-=D,LD-=TE,
            M___7.TI-=TI);
    M___1(M___1.Q-=Q) = FD2SA(U0.Z-=CD,CP-=CP,M___1.D-=D,LD-=TE,
            M___1.TI-=TI);
    M___9(M___9.CON-=CON,M___9.Y-.7=Y.7,M___9.Y-.6=Y.6,M___9.Y-.5=Y.5,
            M___9.Y-.4=Y.4,M___9.Y-.3=Y.3,M___9.Y-.2=Y.2,
            M___9.Y-.1=Y.1,M___9.Y-.0=Y.0) = CNTR8D_DEC8(M___10.Z-=CIN,
            Q-.7=A.7,Q-.6=A.6,Q-.5=A.5,Q-.4=A.4,Q-.3=A.3,Q-.2=A.2,
            Q-.1=A.1,Q-.0=A.0);
    U1(CO-=Z) = N1B(M___9.CON-=A);


  /* extractors ****************************/
```

```
    Q-.6 = (M___7.Q-);
    M___9.Y-.0 = (M___1.D-);
    M___9.Y-.6 = (M___7.D-);
    M___9.Y-.2 = (M___3.D-);
    Q-.2 = (M___3.Q-);
    D-.2 = (M___3.TI-);
    M___9.Y-.5 = (M___6.D-);
    Q-.5 = (M___6.Q-);
    D-.5 = (M___6.TI-);
    Q-.7 = (M___8.Q-);
    M___9.Y-.7 = (M___8.D-);
    D-.7 = (M___8.TI-);
    M___9.Y-.4 = (M___5.D-);
    Q-.4 = (M___5.Q-);
    D-.4 = (M___5.TI-);
    Q-.3 = (M___4.Q-);
    D-.3 = (M___4.TI-);
    M___9.Y-.3 = (M___4.D-);
    M___9.Y-.1 = (M___2.D-);
    Q-.1 = (M___2.Q-);
    D-.1 = (M___2.TI-);
    D-.6 = (M___7.TI-);
    D-.0 = (M___1.TI-);
    Q-.0 = (M___1.Q-);

  /* type converters *********************/

ANNOTATIONS
{
  BUS BUS_TYPE = "DOT";
}

END MODULE;


/* * * * * * *  Contents of NET file CNTR8D_DEC8.NET  * * * * * * */


/*******************************************************/
/*  Netlist copyright (C) 1989 LSI Logic Corporation  */
/*******************************************************/


MODULE CNTR8D_DEC8;

INPUTS      A.7,A.6,A.5,A.4,A.3,A.2,A.1,A.0,CIN;
OUTPUTS     CON,Y.7,Y.6,Y.5,Y.4,Y.3,Y.2,Y.1,Y.0;

LEVEL FUNCTION;
DEFINE
  /* implicit connectors *******************/

    CIN- = (CIN);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    Y-.7 = (Y.7);
    Y-.6 = (Y.6);
    Y-.5 = (Y.5);
    Y-.4 = (Y.4);
    Y-.3 = (Y.3);
    Y-.2 = (Y.2);
```

```
    Y-.1 = (Y.1);
    Y-.0 = (Y.0);
    CON- = (CON);

  /* part instances ***************************/

    M___1(M___1.CON-=CON,M___1.Y-.3=Y.3,M___1.Y-.2=Y.2,M___1.Y-.1=Y.1,
          M___1.Y-.0=Y.0) = CNTR8D_DEC8_DEC4(CIN-=CIN,M___1.A-.3=A.3,
          M___1.A-.2=A.2,M___1.A-.1=A.1,M___1.A-.0=A.0);
    M___2(CON-=CON,M___2.Y-.3=Y.3,M___2.Y-.2=Y.2,M___2.Y-.1=Y.1,
          M___2.Y-.0=Y.0) = CNTR8D_DEC8_DEC4(M___2.A-.3=A.3,
          M___2.A-.2=A.2,M___2.A-.1=A.1,M___2.A-.0=A.0,
          M___1.CON-=CIN);

  /* extractors ******************************/

    A-.7 = (M___2.A-.3);
    A-.6 = (M___2.A-.2);
    A-.5 = (M___2.A-.1);
    A-.4 = (M___2.A-.0);
    A-.3 = (M___1.A-.3);
    A-.2 = (M___1.A-.2);
    A-.1 = (M___1.A-.1);
    A-.0 = (M___1.A-.0);
    Y-.3 = (M___1.Y-.3);
    Y-.2 = (M___1.Y-.2);
    Y-.1 = (M___1.Y-.1);
    Y-.0 = (M___1.Y-.0);
    Y-.7 = (M___2.Y-.3);
    Y-.6 = (M___2.Y-.2);
    Y-.5 = (M___2.Y-.1);
    Y-.4 = (M___2.Y-.0);

  /* type converters *********************/

ANNOTATIONS
{
  BUS BUS_TYPE = "DOT";
}

END MODULE;


/* * * * * * *  Contents of NET file CNTR8D_DEC8_DEC4.NET  * * * * * * */

/********************************************************/
/*  Netlist copyright (C) 1989 LSI Logic Corporation   */
/********************************************************/

MODULE CNTR8D_DEC8_DEC4;

INPUTS      A.3,A.2,A.1,A.0,CIN;
OUTPUTS     CON,Y.3,Y.2,Y.1,Y.0;

LEVEL FUNCTION;
DEFINE
  /* implicit connectors *******************/

    CON- = (CON);
    CIN- = (CIN);
    A-.3 = (A.3);
    A-.2 = (A.2);
    A-.1 = (A.1);
    A-.0 = (A.0);
    Y-.3 = (Y.3);
    Y-.2 = (Y.2);
    Y-.1 = (Y.1);
    Y-.0 = (Y.0);
```

```
  /* part instances ***************************/

    M___13(M___13.Z-=Z) = ENB(M___8.Z-=A,M___13.B-=B);
    M___7(M___7.Z-=Z) = ND3A(M___1.Z-=A,M___3.Z-=C,M___2.Z-=B);
    M___11(M___11.Z-=Z) = ENB(M___6.Z-=A,M___11.B-=B);
    M___6(M___6.Z-=Z) = ND2A(M___1.Z-=A,M___2.Z-=B);
    M___2(M___2.Z-=Z) = N1B(M___2.A-=A);
    M___4(M___4.Z-=Z) = N1B(M___4.A-=A);
    M___8(M___8.Z-=Z) = ND4A(M___1.Z-=A,M___3.Z-=C,M___2.Z-=B,
           M___4.Z-=D);
    M___3(M___3.Z-=Z) = N1B(M___3.A-=A);
    M___9(CON-=Z) = ND4B(M___5.Z-=D,M___4.Z-=C,M___2.Z-=A,M___3.Z-=B);
    M___5(M___5.Z-=Z) = NR2A(CIN-=A,M___5.B-=B);
    M___1(M___1.Z-=Z) = N1C(CIN-=A);
    M___10(M___10.Z-=Z) = EOB(M___1.Z-=A,M___10.B-=B);
    M___12(M___12.Z-=Z) = ENB(M___7.Z-=A,M___12.B-=B);

  /* extractors ******************************/

    Y-.0 = (M___10.Z-);
    Y-.3 = (M___13.Z-);
    A-.3 = (M___13.B-);
    Y-.1 = (M___11.Z-);
    A-.1 = (M___11.B-);
    A-.0 = (M___2.A-);
    A-.2 = (M___4.A-);
    A-.1 = (M___3.A-);
    A-.3 = (M___5.B-);
    A-.0 = (M___10.B-);
    A-.2 = (M___12.B-);
    Y-.2 = (M___12.Z-);

  /* type converters *********************/

ANNOTATIONS
{
  BUS BUS_TYPE = "DOT";
}

END MODULE;


/* * * * * * *  Contents of NET file SYNC.NET  * * * * * * */

/*******************************************************/
/*  Netlist copyright (C) 1989 LSI Logic Corporation   */
/*******************************************************/


MODULE SYNC;

INPUTS      CP,D,RESET_,SCLR_;
OUTPUTS     Z;

LEVEL FUNCTION;
DEFINE
  /* implicit connectors *******************/

    CP- = (CP);
    RESET_- = (RESET_);
    D- = (D);
    SCLR_- = (SCLR_);
    U1.TI- = (NC/0/);
    Z- = (Z);

  /* part instances ***************************/

    U2(U2.Z-=Z) = N1B(SCLR_-=A);
    U1(U1.Q-=Q) = FD2SA(CP-=CP,RESET_-=CD,D-=D,U2.Z-=TE,U1.TI-=TI);
    U0(Z-=Q) = FD2SA(U1.Q-=D,CP-=CP,RESET_-=CD,U2.Z-=TE,U1.TI-=TI);
```

```
  /* extractors *******************************/


  /* type converters *********************/

ANNOTATIONS
{
  BUS BUS_TYPE = "DOT";
}

END MODULE;



/* * * * * * *  Contents of NET file MRGCNTV1CR.NET  * * * * * * */

/*******************************************************/
/*  Netlist copyright (C) 1989 LSI Logic Corporation  */
/*******************************************************/


MODULE MRGCNTV1CR;

INPUTS      CO,CTEFF,CTONLY,FE,FNE,HDF,LS_1,LWONLY,OFF,REQ_O,
            STBIT0I,STBIT1I,STBIT2I,STBIT3I,STF,WAIT;
OUTPUTS     CE,FEAK,LDC,LDH,LDK,LDM,LDY,MWAIT,RD_,STBIT0O,STBIT1O,
            STBIT2O,STBIT3O,WE;

LEVEL FUNCTION;
DEFINE
  /* implicit connectors *******************/

    CTONLY- = (CTONLY);
    OFF- = (OFF);
    LS_1- = (LS_1);
    CTEFF- = (CTEFF);
    WAIT- = (WAIT);
    WE- = (WE);
    STBIT2I- = (STBIT2I);
    REQ_O- = (REQ_O);
    LWONLY- = (LWONLY);
    STBIT1I- = (STBIT1I);
    LDY- = (LDY);
    LDH- = (LDH);
    STBIT0I- = (STBIT0I);
    CO- = (CO);
    STBIT3I- = (STBIT3I);
    HDF- = (HDF);
    STBIT0O- = (STBIT0O);
    STBIT2O- = (STBIT2O);
    STBIT3O- = (STBIT3O);
    FNE- = (FNE);
    LDK- = (LDK);
    LDM- = (LDM);
    MWAIT- = (MWAIT);
    FEAK- = (FEAK);
    LDC- = (LDC);
    STF- = (STF);
    FE- = (FE);
    RD_- = (RD_);
    STBIT1O- = (STBIT1O);
    CE- = (CE);


  /* part instances **************************/

    M303(M303.Z-=Z) = N1B(CTONLY-=A);
    M295(M295.Z-=Z) = N1C(M303.Z-=A);
    M64(M64.Z-=Z) = N1C(LS_1-=A);
    M252(M252.Z-=Z) = N1C(M64.Z-=A);
    M262(M262.Z-=Z) = N1B(CTEFF-=A);
    M260(M260.Z-=Z) = N1C(M262.Z-=A);
```

```
M52(M52.Z--Z) = N1D(WAIT--A);
M310(M310.Z--Z) = N1C(M52.Z--A);
M1(M1.Z--Z) = N1D(STBIT2I--A);
M248(M248.Z--Z) = AND2B(M253.Z--A,M311.Z--B);
M217(M217.Z--Z) = AND3B(M311.Z--C,M310.Z--B,M263.Z--A);
M133(M133.Z--Z) = N1C(REQ_O--A);
M40(M40.Z--Z) = N1C(LWONLY--A);
M80(M80.Z--Z) = ND2B(M40.Z--A,M295.Z--B);
M82(M82.Z--Z) = NR2B(M80.Z--A,M81.Z--B);
M81(M81.Z--Z) = ND2B(M52.Z--A,M311.Z--B);
M90(M90.Z--Z) = NR2B(M81.Z--B,M88.Z--A);
M88(M88.Z--Z) = ND2B(M40.Z--B,M260.Z--A);
M263(M263.Z--Z) = N1C(M40.Z--A);
M138(M138.Z--Z) = AND3B(M133.Z--A,M260.Z--C,M253.Z--B);
M142(M142.Z--Z) = AND2B(M263.Z--B,M253.Z--A);
M324(M324.Z--Z) = N1D(M1.Z--A);
M3(M3.Z--Z) = N1D(STBIT1I--A);
M66(M66.Z--Z) = AND3B(M311.Z--B,M260.Z--A,M3.Z--C);
M75(M75.Z--Z) = AND3C(M335.Z--C,M1.Z--B,M3.Z--A);
M67(M67.Z--Z) = AND2C(M335.Z--B,M1.Z--A);
M257(M257.Z--Z) = ND4B(M335.Z--D,M52.Z--B,M3.Z--C,M263.Z--A);
M321(LDY--Z) = ND2B(M39.Z--B,M31.Z--A);
M318(LDH--Z) = ND2B(M27.Z--A,M35.Z--B);
M130(M130.Z--Z) = ND4B(M335.Z--D,M12.Z--A,M324.Z--C,M3.Z--B);
M129(M129.Z--Z) = ND4B(M335.Z--D,M1.Z--C,M12.Z--A,STBIT1I--B);
M131(M131.Z--Z) = ND3B(M335.Z--C,M1.Z--B,M12.Z--A);
M311(M311.Z--Z) = N1D(M12.Z--A);
M12(M12.Z--Z) = N1D(STBIT0I--A);
M116(M116.Z--Z) = ND2B(M335.Z--B,M3.Z--A);
M115(M115.Z--Z) = ND3B(M311.Z--A,M324.Z--C,M3.Z--B);
M154(M154.Z--Z) = ND4B(M335.Z--D,M12.Z--A,M324.Z--C,STBIT1I--B);
M162(M162.Z--Z) = AND3B(M40.Z--C,M260.Z--B,M253.Z--A);
M41(M41.Z--Z) = AND3B(M40.Z--C,M253.Z--B,M246.Z--A);
M44(M44.Z--Z) = ND3B(M340.Z--C,M41.Z--A,M42.Z--B);
M188(M188.Z--Z) = ND3B(M340.Z--C,M42.Z--B,M185.Z--A);
M190(M190.Z--Z) = AND3B(M311.Z--C,M310.Z--B,M260.Z--A);
M192(M192.Z--Z) = ND3B(M340.Z--C,M185.Z--A,M190.Z--B);
M199(M199.Z--Z) = AND3B(M251.Z--B,M253.Z--C,OFF--A);
M78(M78.Z--Z) = ND2B(M252.Z--A,M253.Z--B);
M79(M79.Z--Z) = NR2C(M77.Z--A,M78.Z--B);
M76(M76.Z--Z) = ND3B(M75.Z--C,M73.Z--A,M74.Z--B);
M51(M51.Z--Z) = AND3B(M49.Z--A,M50.Z--B,M251.Z--C);
M101(M101.Z--Z) = AND3B(M52.Z--C,M253.Z--A,M263.Z--B);
M105(M105.Z--Z) = ND3B(M360.Z--C,M100.Z--A,M101.Z--B);
M100(M100.Z--Z) = AND3B(M49.Z--A,M50.Z--B,M252.Z--C);
M50(M50.Z--Z) = N1C(CO--A);
M246(M246.Z--Z) = N1C(M50.Z--A);
M176(M176.Z--Z) = AND3B(M311.Z--C,M253.Z--A,M263.Z--B);
M178(M178.Z--Z) = ND3B(M75.Z--C,M175.Z--A,M176.Z--B);
M175(M175.Z--Z) = AND3B(M50.Z--B,M252.Z--C,OFF--A);
M73(M73.Z--Z) = AND3B(M49.Z--A,M50.Z--B,M253.Z--C);
M49(M49.Z--Z) = N1C(OFF--A);
M118(M118.Z--Z) = AND3B(M52.Z--A,M311.Z--B,M3.Z--C);
M210(M210.Z--Z) = ND3B(M118.Z--B,M207.Z--A,M30.Z--C);
M120(M120.Z--Z) = ND3C(M117.Z--A,M118.Z--B,M30.Z--C);
M117(M117.Z--Z) = AND3B(M49.Z--A,M253.Z--B,M263.Z--C);
M77(M77.Z--Z) = ND2B(M49.Z--A,M251.Z--B);
M167(M167.Z--Z) = AND2B(OFF--A,M251.Z--B);
M251(M251.Z--Z) = N1C(M133.Z--A);
M121(M121.Z--Z) = AND3B(M49.Z--A,M251.Z--B,M253.Z--C);
M126(M126.Z--Z) = AND3B(M52.Z--B,M311.Z--C,M295.Z--A);
M128(M128.Z--Z) = ND3B(M108.Z--C,M121.Z--A,M126.Z--B);
M108(M108.Z--Z) = AND3C(M8.Z--C,M324.Z--B,M3.Z--A);
M9(M9.Z--Z) = AND2C(M8.Z--B,M1.Z--A);
M30(M30.Z--Z) = AND2C(M8.Z--B,M324.Z--A);
M264(M264.Z--Z) = ND3B(M212.Z--A,M8.Z--C,M249.Z--B);
M8(M8.Z--Z) = N1D(STBIT3I--A);
M335(M335.Z--Z) = N1D(M8.Z--A);
M214(M214.Z--Z) = AND3B(M8.Z--C,M12.Z--A,M324.Z--B);
M256(M256.Z--Z) = ND4B(M255.Z--A,M12.Z--B,M324.Z--D,M3.Z--C);
M255(M255.Z--Z) = N1B(HDF--A);
M107(M107.Z--Z) = AND2C(M12.Z--B,M253.Z--A);
M275(M275.Z--Z) = AND2B(M31.Z--A,M39.Z--B);
M146(M146.Z--Z) = AND2B(M253.Z--A,M295.Z--B);
```

```
M149(M149.Z--Z) = ND3B(M143.Z--B,M144.Z--C,M146.Z--A);
M143(M143.Z--Z) = AND2B(M310.Z--A,M311.Z--B);
M150(M150.Z--Z) = AND2B(M253.Z--A,M260.Z--B);
M153(M153.Z--Z) = ND3B(M143.Z--B,M144.Z--C,M150.Z--A);
M284(M284.Z--Z) = NR2B(M283.Z--B,M282.Z--A);
M156(M156.Z--Z) = AND3B(M40.Z--B,M295.Z--C,M253.Z--A);
M160(M160.Z--Z) = ND3B(M360.Z--C,M155.Z--A,M156.Z--B);
M282(M282.Z--Z) = ND3B(M280.Z--A,M281.Z--B,M160.Z--C);
M281(M281.Z--Z) = AND2B(M153.Z--B,M149.Z--A);
M304(M304.Z--Z) = ND3B(M280.Z--B,M302.Z--A,M149.Z--C);
M308(M308.Z--Z) = NR2B(M304.Z--A,M307.Z--B);
M317(STBIT00--Z) = ND3B(M316.Z--C,M308.Z--B,M301.Z--A);
M301(M301.Z--Z) = NR2B(M297.Z--A,M300.Z--B);
M297(M297.Z--Z) = ND3B(M276.Z--A,M296.Z--B,M84.Z--C);
M277(M277.Z--Z) = ND3B(M98.Z--C,M275.Z--A,M276.Z--B);
M279(M279.Z--Z) = NR2B(M277.Z--A,M278.Z--B);
M290(STBIT20--Z) = ND3B(M289.Z--C,M284.Z--B,M279.Z--A);
M289(M289.Z--Z) = NR2B(M288.Z--B,M287.Z--A);
M288(M288.Z--Z) = ND4B(M215.Z--A,M219.Z--B,M227.Z--C,M239.Z--D);
M331(M331.Z--Z) = NR2B(M330.Z--B,M329.Z--A);
M329(M329.Z--Z) = ND2B(M243.Z--B,M239.Z--A);
M239(M239.Z--Z) = ND3B(M107.Z--B,M212.Z--A,M238.Z--C);
M13(M13.Z--Z) = AND2C(M12.Z--A,STBIT1I--B);
M4(M4.Z--Z) = AND2C(M5.Z--A,M253.Z--B);
M291(M291.Z--Z) = AND3B(M19.Z--B,M31.Z--C,M15.Z--A);
M266(M266.Z--Z) = ND4B(M39.Z--D,M31.Z--B,M27.Z--A,M35.Z--C);
M137(M137.Z--Z) = ND3B(M70.Z--B,M134.Z--A,M30.Z--C);
M72(M72.Z--Z) = ND3B(M65.Z--A,M70.Z--B,M67.Z--C);
M221(M221.Z--Z) = AND3B(M311.Z--B,M3.Z--C,M263.Z--A);
M223(M223.Z--Z) = ND3B(M65.Z--A,M221.Z--B,M67.Z--C);
M272(M272.Z--Z) = ND3B(M219.Z--B,M128.Z--A,M223.Z--C);
M273(M273.Z--Z) = NR2B(M272.Z--B,M271.Z--A);
M270(M270.Z--Z) = NR2B(M268.Z--A,M269.Z--B);
M274(STBIT30--Z) = ND3B(M273.Z--C,M270.Z--B,M267.Z--A);
M267(M267.Z--Z) = NR2B(M265.Z--A,M266.Z--B);
M211(M211.Z--Z) = N1B(FNE--A);
M11(M11.Z--Z) = AND2C(M253.Z--B,FNE--A);
M23(M23.Z--Z) = ND3B(M9.Z--C,M11.Z--A,M2.Z--B);
M322(LDK--Z) = ND2B(M10.Z--A,M23.Z--B);
M265(M265.Z--Z) = ND4B(M10.Z--A,M23.Z--D,M19.Z--C,M15.Z--B);
M320(LDM--Z) = ND2B(M19.Z--B,M15.Z--A);
M366(M366.Z--Z) = NR2B(M362.Z--A,M365.Z--B);
M358(M358.Z--Z) = NR2B(M354.Z--A,M357.Z--B);
M367(MWAIT--Z) = ND3B(M366.Z--C,M358.Z--B,M350.Z--A);
M350(M350.Z--Z) = NR2B(M346.Z--A,M349.Z--B);
M344(M344.Z--Z) = AND2B(M27.Z--A,M31.Z--B);
M346(M346.Z--Z) = ND3B(M343.Z--A,M344.Z--B,M345.Z--C);
M343(M343.Z--Z) = AND2B(M15.Z--A,M19.Z--B);
M19(M19.Z--Z) = ND3C(M4.Z--A,M9.Z--C,M13.Z--B);
M15(M15.Z--Z) = ND3C(M9.Z--C,M11.Z--A,M13.Z--B);
M337(M337.Z--Z) = AND3B(M10.Z--A,M19.Z--C,M15.Z--B);
M342(FEAK--Z) = ND3B(M341.Z--C,M338.Z--B,M337.Z--A);
M339(M339.Z--Z) = ND2B(M39.Z--B,M35.Z--A);
M341(M341.Z--Z) = NR2B(M339.Z--A,LDC--B);
M319(LDC--Z) = ND2B(M114.Z--B,M109.Z--A);
M99(M99.Z--Z) = ND4B(M335.Z--D,M52.Z--A,M324.Z--C,M3.Z--B);
M347(M347.Z--Z) = AND2B(M94.Z--A,M99.Z--B);
M349(M349.Z--Z) = ND3B(M114.Z--C,M347.Z--A,M348.Z--B);
M253(M253.Z--Z) = N1D(M93.Z--A);
M93(M93.Z--Z) = N1C(STF--A);
M110(M110.Z--Z) = ND3B(M93.Z--A,M335.Z--C,M3.Z--B);
M348(M348.Z--Z) = AND2B(M109.Z--A,M110.Z--B);
M109(M109.Z--Z) = ND3C(M108.Z--C,M107.Z--B,M106.Z--A);
M106(M106.Z--Z) = AND2B(HDF--B,FNE--A);
M213(M213.Z--Z) = AND2B(HDF--A,M253.Z--B);
M215(M215.Z--Z) = ND3B(M212.Z--A,M214.Z--C,M213.Z--B);
M212(M212.Z--Z) = AND2C(M211.Z--B,FE--A);
M5(M5.Z--Z) = N1B(FE--A);
M111(M111.Z--Z) = AND2B(HDF--B,M5.Z--A);
M114(M114.Z--Z) = ND3C(M108.Z--C,M107.Z--B,M111.Z--A);
M206(M206.Z--Z) = ND3B(M108.Z--C,M122.Z--B,M199.Z--A);
M202(M202.Z--Z) = ND3B(M108.Z--C,M126.Z--B,M199.Z--A);
M286(M286.Z--Z) = AND2B(M206.Z--B,M202.Z--A);
M287(M287.Z--Z) = ND3B(M285.Z--A,M286.Z--B,M210.Z--C);
```

```
M285(M285.Z--Z) = AND2B(M192.Z--A,M198.Z--B);
M198(M198.Z--Z) = ND3B(M360.Z--C,M162.Z--B,M179.Z--A);
M166(M166.Z--Z) = ND3B(M360.Z--C,M155.Z--A,M162.Z--B);
M306(M306.Z--Z) = AND2B(M160.Z--A,M166.Z--B);
M307(M307.Z--Z) = ND3B(M178.Z--C,M305.Z--A,M306.Z--B);
M305(M305.Z--Z) = AND2B(M154.Z--B,M153.Z--A);
M328(M328.Z--Z) = AND3B(M215.Z--C,M131.Z--A,M154.Z--B);
M332(RD_--Z) = ND3B(M331.Z--C,M327.Z--A,M328.Z--B);
M327(M327.Z--Z) = AND3B(M116.Z--C,M115.Z--B,M94.Z--A);
M94(M94.Z--Z) = ND2B(M93.Z--A,M12.Z--B);
M25(M25.Z--Z) = AND2B(M3.Z--B,M12.Z--A);
M27(M27.Z--Z) = ND3C(M9.Z--C,M11.Z--A,M25.Z--B);
M338(M338.Z--Z) = AND3B(M23.Z--A,M31.Z--C,M27.Z--B);
M31(M31.Z--Z) = ND3C(M4.Z--A,M13.Z--B,M30.Z--C);
M39(M39.Z--Z) = ND3C(M11.Z--A,M13.Z--B,M30.Z--C);
M345(M345.Z--Z) = AND2B(M35.Z--A,M39.Z--B);
M35(M35.Z--Z) = ND3C(M4.Z--A,M9.Z--C,M25.Z--B);
M10(M10.Z--Z) = ND3B(M4.Z--A,M9.Z--C,M2.Z--B);
M2(M2.Z--Z) = AND2B(M3.Z--B,M311.Z--A);
M95(M95.Z--Z) = AND2B(M253.Z--A,M310.Z--B);
M98(M98.Z--Z) = ND3B(M2.Z--B,M95.Z--A,M97.Z--C);
M97(M97.Z--Z) = AND2B(M324.Z--A,M335.Z--B);
M43(M43.Z--Z) = ND2C(M335.Z--B,M3.Z--A);
M340(M340.Z--Z) = N1D(M43.Z--A);
M48(M48.Z--Z) = ND3B(M340.Z--C,M45.Z--A,M46.Z--B);
M276(M276.Z--Z) = AND2B(M44.Z--A,M48.Z--B);
M268(M268.Z--Z) = ND4B(M48.Z--B,M72.Z--D,M44.Z--A,M68.Z--C);
M296(M296.Z--Z) = AND2B(M68.Z--A,M72.Z--B);
M68(M68.Z--Z) = ND3B(M65.Z--A,M66.Z--B,M67.Z--C);
M258(M258.Z--Z) = AND2B(M246.Z--A,M252.Z--B);
M259(M259.Z--Z) = AND2B(M263.Z--A,M3.Z--B);
M261(M261.Z--Z) = ND3B(M67.Z--C,M258.Z--A,M259.Z--B);
M364(M364.Z--Z) = AND2B(M257.Z--A,M261.Z--B);
M365(M365.Z--Z) = ND3B(M264.Z--C,M363.Z--A,M364.Z--B);
M330(M330.Z--Z) = ND2B(M264.Z--B,M256.Z--A);
M363(M363.Z--Z) = AND2B(M254.Z--A,M256.Z--B);
M254(M254.Z--Z) = ND3B(M340.Z--C,M172.Z--B,M244.Z--A);
M244(M244.Z--Z) = AND2B(M246.Z--A,M133.Z--B);
M247(M247.Z--Z) = ND3B(M340.Z--C,M168.Z--B,M244.Z--A);
M168(M168.Z--Z) = AND2B(M260.Z--A,M52.Z--B);
M170(M170.Z--Z) = ND3B(M340.Z--C,M167.Z--A,M168.Z--B);
M353(M353.Z--Z) = AND2B(M154.Z--A,M170.Z--B);
M354(M354.Z--Z) = ND3B(M351.Z--A,M352.Z--B,M353.Z--C);
M351(M351.Z--Z) = AND2B(M120.Z--A,M130.Z--B);
M292(M292.Z--Z) = AND3B(M129.Z--B,M39.Z--A,M130.Z--C);
M294(STBIT1O--Z) = ND3B(M291.Z--A,M292.Z--B,M293.Z--C);
M293(M293.Z--Z) = AND2B(M239.Z--A,M243.Z--B);
M243(M243.Z--Z) = ND3B(M107.Z--B,M212.Z--A,M242.Z--C);
M242(M242.Z--Z) = AND2B(STBIT1I--A,M1.Z--B);
M238(M238.Z--Z) = AND3B(M8.Z--C,M324.Z--B,STBIT1I--A);
M144(M144.Z--Z) = AND2B(M3.Z--A,M324.Z--B);
M145(M145.Z--Z) = ND3B(M142.Z--A,M143.Z--B,M144.Z--C);
M280(M280.Z--Z) = AND2B(M141.Z--A,M145.Z--B);
M141(M141.Z--Z) = ND3B(M138.Z--A,M139.Z--B,M30.Z--C);
M139(M139.Z--Z) = AND3B(M40.Z--A,M311.Z--B,M3.Z--C);
M134(M134.Z--Z) = AND3B(M40.Z--C,M133.Z--A,M253.Z--B);
M179(M179.Z--Z) = AND3B(M50.Z--A,M133.Z--B,M252.Z--C);
M184(M184.Z--Z) = ND3B(M360.Z--C,M156.Z--B,M179.Z--A);
M283(M283.Z--Z) = ND4B(M178.Z--B,M166.Z--A,M188.Z--D,M184.Z--C);
M309(M309.Z--Z) = AND2B(M184.Z--A,M188.Z--B);
M312(M312.Z--Z) = ND3B(M285.Z--B,M286.Z--C,M309.Z--A);
M316(M316.Z--Z) = NR2B(M312.Z--A,M315.Z--B);
M315(M315.Z--Z) = ND3B(M313.Z--A,M314.Z--B,M250.Z--C);
M314(M314.Z--Z) = AND2B(M223.Z--A,M227.Z--B);
M227(M227.Z--Z) = ND3B(M340.Z--C,M185.Z--A,M217.Z--B);
M219(M219.Z--Z) = ND3B(M340.Z--C,M216.Z--A,M217.Z--B);
M313(M313.Z--Z) = AND2B(M210.Z--A,M219.Z--B);
M356(M356.Z--Z) = AND2B(M206.Z--A,M210.Z--B);
M357(M357.Z--Z) = ND3B(M215.Z--C,M355.Z--A,M356.Z--B);
M355(M355.Z--Z) = AND2B(M174.Z--A,M202.Z--B);
M174(M174.Z--Z) = ND3B(M340.Z--C,M167.Z--A,M172.Z--B);
M172(M172.Z--Z) = AND2B(M295.Z--A,M52.Z--B);
M231(M231.Z--Z) = ND3B(M340.Z--C,M172.Z--B,M228.Z--A);
M228(M228.Z--Z) = AND2B(M246.Z--A,M64.Z--B);
```

```
M235(M235.Z--Z) = ND3B(M340.Z--C,M168.Z--B,M228.Z--A);
M359(M359.Z--Z) = AND2B(M231.Z--A,M235.Z--B);
M362(M362.Z--Z) = ND3B(M361.Z--C,M293.Z--B,M359.Z--A);
M361(M361.Z--Z) = AND2B(M250.Z--B,M247.Z--A);
M250(M250.Z--Z) = ND3B(M8.Z--C,M248.Z--A,M249.Z--B);
M249(M249.Z--Z) = AND2B(M3.Z--A,M1.Z--B);
M55(M55.Z--Z) = ND2B(M335.Z--B,M1.Z--A);
M54(M54.Z--Z) = ND2B(M311.Z--A,M3.Z--B);
M56(M56.Z--Z) = OR2B(M55.Z--B,M54.Z--A);
M360(M360.Z--Z) = N1C(M56.Z--A);
M63(M63.Z--Z) = ND3B(M360.Z--C,M51.Z--A,M59.Z--B);
M53(M53.Z--Z) = AND3B(M52.Z--C,M295.Z--B,M253.Z--A);
M57(M57.Z--Z) = ND3B(M360.Z--C,M51.Z--A,M53.Z--B);
M333(M333.Z--Z) = AND3B(M76.Z--C,M63.Z--B,M57.Z--A);
M336(WE--Z) = ND3B(M333.Z--A,M334.Z--B,M325.Z--C);
M334(M334.Z--Z) = AND3B(M92.Z--B,M84.Z--A,M120.Z--C);
M323(M323.Z--Z) = AND2B(M84.Z--A,M92.Z--B);
M92(M92.Z--Z) = ND3C(M90.Z--B,M79.Z--A,M75.Z--C);
M84(M84.Z--Z) = ND3C(M82.Z--B,M79.Z--A,M75.Z--C);
M269(M269.Z--Z) = ND4B(M98.Z--C,M92.Z--B,M105.Z--D,M84.Z--A);
M298(M298.Z--Z) = AND2B(M92.Z--A,M98.Z--B);
M300(M300.Z--Z) = ND3B(M298.Z--A,M299.Z--B,M124.Z--C);
M299(M299.Z--Z) = AND2B(M120.Z--B,M105.Z--A);
M271(M271.Z--Z) = ND4B(M114.Z--B,M124.Z--D,M109.Z--A,M120.Z--C);
M124(M124.Z--Z) = ND3B(M108.Z--C,M121.Z--A,M122.Z--B);
M122(M122.Z--Z) = AND3B(M52.Z--B,M311.Z--C,M260.Z--A);
M59(M59.Z--Z) = AND3B(M52.Z--C,M260.Z--B,M253.Z--A);
M45(M45.Z--Z) = AND3B(M260.Z--C,M253.Z--B,M246.Z--A);
M216(M216.Z--Z) = AND3B(M64.Z--B,M253.Z--C,M246.Z--A);
M65(M65.Z--Z) = AND3B(M50.Z--A,M64.Z--B,M253.Z--C);
M185(M185.Z--Z) = AND3B(M50.Z--A,M252.Z--B,M253.Z--C);
M155(M155.Z--Z) = AND3B(M251.Z--B,M252.Z--C,OFF--A);
M207(M207.Z--Z) = AND3B(M253.Z--B,M263.Z--C,OFF--A);
M74(M74.Z--Z) = AND3B(M52.Z--B,M311.Z--C,M263.Z--A);
M46(M46.Z--Z) = AND3B(M40.Z--A,M311.Z--C,M310.Z--B);
M42(M42.Z--Z) = AND3B(M311.Z--C,M310.Z--B,M295.Z--A);
M70(M70.Z--Z) = AND3B(M311.Z--B,M295.Z--A,M3.Z--C);
M132(M132.Z--Z) = ND3B(M93.Z--A,M324.Z--C,M3.Z--B);
M352(M352.Z--Z) = AND2B(M131.Z--A,M132.Z--B);
M278(M278.Z--Z) = ND4B(M114.Z--B,M137.Z--D,M109.Z--A,M131.Z--C);
M302(M302.Z--Z) = AND2B(M128.Z--A,M137.Z--B);
M325(M325.Z--Z) = AND2B(M124.Z--A,M128.Z--B);
M326(CE--Z) = ND3B(M299.Z--B,M323.Z--A,M325.Z--C);

/* extractors ******************************/


/* type converters *********************/

ANNOTATIONS
{
  BUS BUS_TYPE = "DOT";
}

END MODULE;


/* * * * * * *  Contents of NET file MRGCNTV1FN.NET  * * * * * * */

/*******************************************************/
/*  Netlist copyright (C) 1989 LSI Logic Corporation   */
/*******************************************************/


MODULE MRGCNTV1FN;

INPUTS       CO,CP,CTEFF,CTONLY,FE,FNE,HDF,LS_1,LWONLY,OFF,REQ_O,
             RESET_,STF,WAIT;
OUTPUTS      CE,EN,FEAK_,LDC,LDH,LDK,LDM,LDY,MWAIT,RD_,WE;
```

```
LEVEL FUNCTION;
DEFINE
  /* implicit connectors *******************/

    MWAIT- = (MWAIT);
    WAIT- = (WAIT);
    STF- = (STF);
    REQ_O- = (REQ_O);
    OFF- = (OFF);
    LWONLY- = (LWONLY);
    HDF- = (HDF);
    FNE- = (FNE);
    FE- = (FE);
    CTONLY- = (CTONLY);
    CO- = (CO);
    FEAK_- = (FEAK_);
    WE- = (WE);
    LDM- = (LDM);
    LDH- = (LDH);
    LDK- = (LDK);
    LDC- = (LDC);
    CE- = (CE);
    LDY- = (LDY);
    EN- = (EN);
    RD_- = (RD_);
    RESET_- = (RESET_);
    RESET_- = (RESET_);
    CP- = (CP);
    CP- = (CP);
    LS_1- = (LS_1);
    CTEFF- = (CTEFF);


  /* part instances ***************************/

    U2(RD_-=Q) = FD4A(U0.RD_-=D,CP-=CP,RESET_-=SD);
    U3.7(U3.QN-.7=QN,U3.Q-.7=Q) = FD2A(U3.D-.7=D,RESET_-=CD,CP-=CP);
    U3.6(U3.QN-.6=QN,U3.Q-.6=Q) = FD2A(U3.D-.6=D,RESET_-=CD,CP-=CP);
    U3.5(U3.QN-.5=QN,U3.Q-.5=Q) = FD2A(U3.D-.5=D,RESET_-=CD,CP-=CP);
    U3.4(U3.QN-.4=QN,U3.Q-.4=Q) = FD2A(U3.D-.4=D,RESET_-=CD,CP-=CP);
    U3.3(U3.QN-.3=QN,U3.Q-.3=Q) = FD2A(U3.D-.3=D,RESET_-=CD,CP-=CP);
    U3.2(U3.QN-.2=QN,U3.Q-.2=Q) = FD2A(U3.D-.2=D,RESET_-=CD,CP-=CP);
    U3.1(U3.QN-.1=QN,U3.Q-.1=Q) = FD2A(U3.D-.1=D,RESET_-=CD,CP-=CP);
    U3.0(U3.QN-.0=QN,U3.Q-.0=Q) = FD2A(U3.D-.0=D,RESET_-=CD,CP-=CP);
    U1.3(U1.Q-.3=Q) = FD2A(U1.D-.3=D,RESET_-=CD,CP-=CP);
    U1.2(U1.Q-.2=Q) = FD2A(U1.D-.2=D,RESET_-=CD,CP-=CP);
    U1.1(U1.Q-.1=Q) = FD2A(U1.D-.1=D,RESET_-=CD,CP-=CP);
    U1.0(U1.Q-.0=Q) = FD2A(U1.D-.0=D,RESET_-=CD,CP-=CP);
    U0(MWAIT-=MWAIT,U0.RD_-=RD_,U0.CE-=CE,U0.FEAK-=FEAK,U0.LDC-=LDC,
            U0.LDH-=LDH,U0.LDK-=LDK,U0.LDM-=LDM,U0.LDY-=LDY,EN-=WE,
            U0.STBIT0O-=STBIT0O,U0.STBIT1O-=STBIT1O,U0.STBIT2O-=STBIT2O,
            U0.STBIT3O-=STBIT3O) = MRGCNTV1CR(WAIT-=WAIT,STF-=STF,
            REQ_O-=REQ_O,OFF-=OFF,LWONLY-=LWONLY,HDF-=HDF,FNE-=FNE,
            FE-=FE,CTONLY-=CTONLY,CTEFF-=CTEFF,CO-=CO,U0.STBIT3I-=STBIT3I,
            U0.STBIT2I-=STBIT2I,U0.STBIT1I-=STBIT1I,U0.STBIT0I-=STBIT0I,
            LS_1-=LS_1);


  /* extractors ********************************/

    U1.D-.3 = (U0.STBIT3O-);
    U1.D-.2 = (U0.STBIT2O-);
    U1.D-.1 = (U0.STBIT1O-);
    U1.D-.0 = (U0.STBIT0O-);
    U3.QN-.0 = (FEAK_-);
    U3.Q-.6 = (WE-);
    U3.Q-.4 = (LDM-);
    U3.Q-.2 = (LDH-);
    U3.Q-.3 = (LDK-);
    U3.Q-.1 = (LDC-);
    U3.Q-.7 = (CE-);
    U3.Q-.5 = (LDY-);
    U3.D-.0 = (U0.FEAK-);
    U3.D-.7 = (U0.CE-);
```

```
U3.D-.2 = (U0.LDH-);
U3.D-.4 = (U0.LDM-);
U3.D-.1 = (U0.LDC-);
U3.D-.5 = (U0.LDY-);
U3.D-.6 = (EN-);
U3.D-.3 = (U0.LDK-);
U1.Q-.2 = (U0.STBIT2I-);
U1.Q-.1 = (U0.STBIT1I-);
U1.Q-.3 = (U0.STBIT3I-);
U1.Q-.0 = (U0.STBIT0I-);


 /* type converters *********************/

ANNOTATIONS
{
 BUS BUS_TYPE = "DOT";
}

END MODULE;


/* * * * * * *  Contents of NET file MRGRV1.NET  * * * * * * */

/*****************************************************/
/*  Netlist copyright (C) 1989 LSI Logic Corporation  */
/*****************************************************/


MODULE MRGRV1;

INPUTS       CNV.7,CNV.6,CNV.5,CNV.4,CNV.3,CNV.2,CNV.1,CNV.0,CP,
             FD.15,FD.14,FD.13,FD.12,FD.11,FD.10,FD.9,FD.8,FD.7,
             FD.6,FD.5,FD.4,FD.3,FD.2,FD.1,FD.0,NS.1,NS.0,OFF,
             RDY_F,REQ_O,RESET_,STF,WAIT;
OUTPUTS      DO.7,DO.6,DO.5,DO.4,DO.3,DO.2,DO.1,DO.0,MWAIT,RD_,
             SPR.1,SPR.0,WE;

LEVEL FUNCTION;
DEFINE
  /* implicit connectors *******************/

    MWAIT- = (MWAIT);
    WE- = (WE);
    RD_- = (RD_);
    REQ_O- = (REQ_O);
    RESET_- = (RESET_);
    BRESET_- = (BRESET_);
    BRESET_- = (BRESET_);
    HDF- = (HDF);
    HDF- = (HDF);
    CTONLY- = (CTONLY);
    CTONLY- = (CTONLY);
    LWONLY- = (LWONLY);
    LWONLY- = (LWONLY);
    CTEFF- = (CTEFF);
    CTEFF- = (CTEFF);
    U14.D- = (NC/1/);
    U11.G- = (NC/1/);
    BRESET_- = (BRESET_);
    FEAK_- = (FEAK_);
    FEAK_- = (FEAK_);
    RDY_F- = (RDY_F);
    BRESET_- = (BRESET_);
    CP- = (CP);
    CP- = (CP);
    CP- = (CP);
    BRESET_- = (BRESET_);
    LS- = (LS);
    LS- = (LS);
    OFF- = (OFF);
    OFF- = (OFF);
    BRESET_- = (BRESET_);
```

```
DO-.7 = (DO.7);
DO-.6 = (DO.6);
DO-.5 = (DO.5);
DO-.4 = (DO.4);
DO-.3 = (DO.3);
DO-.2 = (DO.2);
DO-.1 = (DO.1);
DO-.0 = (DO.0);
CP- = (CP);
BRESET_- = (BRESET_);
LDC- = (LDC);
LDC- = (LDC);
CP- = (CP);
BRESET_- = (BRESET_);
LDM- = (LDM);
LDM- = (LDM);
CP- = (CP);
FD-.15 = (FD.15);
FD-.14 = (FD.14);
FD-.13 = (FD.13);
FD-.12 = (FD.12);
FD-.11 = (FD.11);
FD-.10 = (FD.10);
FD-.9 = (FD.9);
FD-.8 = (FD.8);
FD-.7 = (FD.7);
FD-.6 = (FD.6);
FD-.5 = (FD.5);
FD-.4 = (FD.4);
FD-.3 = (FD.3);
FD-.2 = (FD.2);
FD-.1 = (FD.1);
FD-.0 = (FD.0);
FD-.15 = (FD.15);
FD-.14 = (FD.14);
FD-.13 = (FD.13);
FD-.12 = (FD.12);
FD-.11 = (FD.11);
FD-.10 = (FD.10);
FD-.9 = (FD.9);
FD-.8 = (FD.8);
FD-.7 = (FD.7);
FD-.6 = (FD.6);
FD-.5 = (FD.5);
FD-.4 = (FD.4);
FD-.3 = (FD.3);
FD-.2 = (FD.2);
FD-.1 = (FD.1);
FD-.0 = (FD.0);
BRESET_- = (BRESET_);
CP- = (CP);
LDK- = (LDK);
LDK- = (LDK);
BRESET_- = (BRESET_);
LDY- = (LDY);
LDY- = (LDY);
CP- = (CP);
SPR-.1 = (SPR.1);
SPR-.0 = (SPR.0);
SPR-.1 = (SPR.1);
SPR-.0 = (SPR.0);
CNV-.7 = (CNV.7);
CNV-.6 = (CNV.6);
CNV-.5 = (CNV.5);
CNV-.4 = (CNV.4);
CNV-.3 = (CNV.3);
CNV-.2 = (CNV.2);
CNV-.1 = (CNV.1);
CNV-.0 = (CNV.0);
BWAIT- = (BWAIT);
WAIT- = (WAIT);
WAIT- = (WAIT);
BWAIT- = (BWAIT);
BWAIT- = (BWAIT);
```

```
NS-.1 = (NS.1);
NS-.0 = (NS.0);
CP- = (CP);
CP- = (CP);
LDH- = (LDH);
LDH- = (LDH);
LDH- = (LDH);
BRESET_- = (BRESET_);
BRESET_- = (BRESET_);
STF- = (STF);


/* part instances **************************/

U15(BRESET_-=Z) = B3A(RESET_-=A);
U12(U12.Z-=Z) = AND2B(BRESET_-=B,FEAK_-=A);
U11(U11.Q-=Q) = LSR2B(U11.G-=R,U11.G-=S,U11.G-=G,U12.Z-=RD,
        RDY_F-=SD);
U14(U14.Q-=Q) = FD2A(U12.Z-=CD,U14.D-=D,RDY_F-=CP);
U13(U13.Z-=Z) = SYNC(CP-=CP,U12.Z-=SCLR_,U14.Q-=D,BRESET_-=RESET_);
U9.15(U9.Q-.15=Q) = FD2SA(FD-.15=TI,BRESET_-=CD,U9.Q-.15=D,LDC-=TE,
        CP-=CP);
U9.14(U9.Q-.14=Q) = FD2SA(FD-.14=TI,BRESET_-=CD,U9.Q-.14=D,LDC-=TE,
        CP-=CP);
U9.13(U9.Q-.13=Q) = FD2SA(FD-.13=TI,BRESET_-=CD,U9.Q-.13=D,LDC-=TE,
        CP-=CP);
U9.12(U9.Q-.12=Q) = FD2SA(FD-.12=TI,BRESET_-=CD,U9.Q-.12=D,LDC-=TE,
        CP-=CP);
U9.11(U9.Q-.11=Q) = FD2SA(FD-.11=TI,BRESET_-=CD,U9.Q-.11=D,LDC-=TE,
        CP-=CP);
U9.10(U9.Q-.10=Q) = FD2SA(FD-.10=TI,BRESET_-=CD,U9.Q-.10=D,LDC-=TE,
        CP-=CP);
U9.9(U9.Q-.9=Q) = FD2SA(FD-.9=TI,BRESET_-=CD,U9.Q-.9=D,LDC-=TE,
        CP-=CP);
U9.8(U9.Q-.8=Q) = FD2SA(FD-.8=TI,BRESET_-=CD,U9.Q-.8=D,LDC-=TE,
        CP-=CP);
U9.7(U9.Q-.7=Q) = FD2SA(FD-.7=TI,BRESET_-=CD,U9.Q-.7=D,LDC-=TE;
        CP-=CP);
U9.6(U9.Q-.6=Q) = FD2SA(FD-.6=TI,BRESET_-=CD,U9.Q-.6=D,LDC-=TE,
        CP-=CP);
U9.5(U9.Q-.5=Q) = FD2SA(FD-.5=TI,BRESET_-=CD,U9.Q-.5=D,LDC-=TE,
        CP-=CP);
U9.4(U9.Q-.4=Q) = FD2SA(FD-.4=TI,BRESET_-=CD,U9.Q-.4=D,LDC-=TE,
        CP-=CP);
U9.3(U9.Q-.3=Q) = FD2SA(FD-.3=TI,BRESET_-=CD,U9.Q-.3=D,LDC-=TE,
        CP-=CP);
U9.2(U9.Q-.2=Q) = FD2SA(FD-.2=TI,BRESET_-=CD,U9.Q-.2=D,LDC-=TE,
        CP-=CP);
U9.1(U9.Q-.1=Q) = FD2SA(FD-.1=TI,BRESET_-=CD,U9.Q-.1=D,LDC-=TE,
        CP-=CP);
U9.0(U9.Q-.0=Q) = FD2SA(FD-.0=TI,BRESET_-=CD,U9.Q-.0=D,LDC-=TE,
        CP-=CP);
U6.15(U6.Q-.15=Q) = FD2SA(FD-.15=TI,BRESET_-=CD,U6.Q-.15=D,LDM-=TE,
        CP-=CP);
U6.14(U6.Q-.14=Q) = FD2SA(FD-.14=TI,BRESET_-=CD,U6.Q-.14=D,LDM-=TE,
        CP-=CP);
U6.13(U6.Q-.13=Q) = FD2SA(FD-.13=TI,BRESET_-=CD,U6.Q-.13=D,LDM-=TE,
        CP-=CP);
U6.12(U6.Q-.12=Q) = FD2SA(FD-.12=TI,BRESET_-=CD,U6.Q-.12=D,LDM-=TE,
        CP-=CP);
U6.11(U6.Q-.11=Q) = FD2SA(FD-.11=TI,BRESET_-=CD,U6.Q-.11=D,LDM-=TE,
        CP-=CP);
U6.10(U6.Q-.10=Q) = FD2SA(FD-.10=TI,BRESET_-=CD,U6.Q-.10=D,LDM-=TE,
        CP-=CP);
U6.9(U6.Q-.9=Q) = FD2SA(FD-.9=TI,BRESET_-=CD,U6.Q-.9=D,LDM-=TE,
        CP-=CP);
U6.8(U6.Q-.8=Q) = FD2SA(FD-.8=TI,BRESET_-=CD,U6.Q-.8=D,LDM-=TE,
        CP-=CP);
U6.7(U6.Q-.7=Q) = FD2SA(FD-.7=TI,BRESET_-=CD,U6.Q-.7=D,LDM-=TE,
        CP-=CP);
U6.6(U6.Q-.6=Q) = FD2SA(FD-.6=TI,BRESET_-=CD,U6.Q-.6=D,LDM-=TE,
        CP-=CP);
U6.5(U6.Q-.5=Q) = FD2SA(FD-.5=TI,BRESET_-=CD,U6.Q-.5=D,LDM-=TE,
        CP-=CP);
```

```
U6.4(U6.Q-.4=Q) = FD2SA(FD-.4=TI,BRESET_-=CD,U6.Q-.4=D,LDM-=TE,
        CP-=CP);
U6.3(U6.Q-.3=Q) = FD2SA(FD-.3=TI,BRESET_-=CD,U6.Q-.3=D,LDM-=TE,
        CP-=CP);
U6.2(U6.Q-.2=Q) = FD2SA(FD-.2=TI,BRESET_-=CD,U6.Q-.2=D,LDM-=TE,
        CP-=CP);
U6.1(U6.Q-.1=Q) = FD2SA(FD-.1=TI,BRESET_-=CD,U6.Q-.1=D,LDM-=TE,
        CP-=CP);
U6.0(U6.Q-.0=Q) = FD2SA(FD-.0=TI,BRESET_-=CD,U6.Q-.0=D,LDM-=TE,
        CP-=CP);
U5.15(U5.Q-.15=Q) = FD2SA(FD-.15=TI,BRESET_-=CD,U5.Q-.15=D,CP-=CP,
        LDK-=TE);
U5.14(U5.Q-.14=Q) = FD2SA(FD-.14=TI,BRESET_-=CD,U5.Q-.14=D,CP-=CP,
        LDK-=TE);
U5.13(U5.Q-.13=Q) = FD2SA(FD-.13=TI,BRESET_-=CD,U5.Q-.13=D,CP-=CP,
        LDK-=TE);
U5.12(U5.Q-.12=Q) = FD2SA(FD-.12=TI,BRESET_-=CD,U5.Q-.12=D,CP-=CP,
        LDK-=TE);
U5.11(U5.Q-.11=Q) = FD2SA(FD-.11=TI,BRESET_-=CD,U5.Q-.11=D,CP-=CP,
        LDK-=TE);
U5.10(U5.Q-.10=Q) = FD2SA(FD-.10=TI,BRESET_-=CD,U5.Q-.10=D,CP-=CP,
        LDK-=TE);
U5.9(U5.Q-.9=Q) = FD2SA(FD-.9=TI,BRESET_-=CD,U5.Q-.9=D,CP-=CP,
        LDK-=TE);
U5.8(U5.Q-.8=Q) = FD2SA(FD-.8=TI,BRESET_-=CD,U5.Q-.8=D,CP-=CP,
        LDK-=TE);
U5.7(U5.Q-.7=Q) = FD2SA(FD-.7=TI,BRESET_-=CD,U5.Q-.7=D,CP-=CP,
        LDK-=TE);
U5.6(U5.Q-.6=Q) = FD2SA(FD-.6=TI,BRESET_-=CD,U5.Q-.6=D,CP-=CP,
        LDK-=TE);
U5.5(U5.Q-.5=Q) = FD2SA(FD-.5=TI,BRESET_-=CD,U5.Q-.5=D,CP-=CP,
        LDK-=TE);
U5.4(U5.Q-.4=Q) = FD2SA(FD-.4=TI,BRESET_-=CD,U5.Q-.4=D,CP-=CP,
        LDK-=TE);
U5.3(U5.Q-.3=Q) = FD2SA(FD-.3=TI,BRESET_-=CD,U5.Q-.3=D,CP-=CP,
        LDK-=TE);
U5.2(U5.Q-.2=Q) = FD2SA(FD-.2=TI,BRESET_-=CD,U5.Q-.2=D,CP-=CP,
        LDK-=TE);
U5.1(U5.Q-.1=Q) = FD2SA(FD-.1=TI,BRESET_-=CD,U5.Q-.1=D,CP-=CP,
        LDK-=TE);
U5.0(U5.Q-.0=Q) = FD2SA(FD-.0=TI,BRESET_-=CD,U5.Q-.0=D,CP-=CP,
        LDK-=TE);
U4.15(U4.Q-.15=Q) = FD2SA(FD-.15=TI,BRESET_-=CD,U4.Q-.15=D,LDY-=TE,
        CP-=CP);
U4.14(U4.Q-.14=Q) = FD2SA(FD-.14=TI,BRESET_-=CD,U4.Q-.14=D,LDY-=TE,
        CP-=CP);
U4.13(U4.Q-.13=Q) = FD2SA(FD-.13=TI,BRESET_-=CD,U4.Q-.13=D,LDY-=TE,
        CP-=CP);
U4.12(U4.Q-.12=Q) = FD2SA(FD-.12=TI,BRESET_-=CD,U4.Q-.12=D,LDY-=TE,
        CP-=CP);
U4.11(U4.Q-.11=Q) = FD2SA(FD-.11=TI,BRESET_-=CD,U4.Q-.11=D,LDY-=TE,
        CP-=CP);
U4.10(U4.Q-.10=Q) = FD2SA(FD-.10=TI,BRESET_-=CD,U4.Q-.10=D,LDY-=TE,
        CP-=CP);
U4.9(U4.Q-.9=Q) = FD2SA(FD-.9=TI,BRESET_-=CD,U4.Q-.9=D,LDY-=TE,
        CP-=CP);
U4.8(U4.Q-.8=Q) = FD2SA(FD-.8=TI,BRESET_-=CD,U4.Q-.8=D,LDY-=TE,
        CP-=CP);
U4.7(U4.Q-.7=Q) = FD2SA(FD-.7=TI,BRESET_-=CD,U4.Q-.7=D,LDY-=TE,
        CP-=CP);
U4.6(U4.Q-.6=Q) = FD2SA(FD-.6=TI,BRESET_-=CD,U4.Q-.6=D,LDY-=TE,
        CP-=CP);
U4.5(U4.Q-.5=Q) = FD2SA(FD-.5=TI,BRESET_-=CD,U4.Q-.5=D,LDY-=TE,
        CP-=CP);
U4.4(U4.Q-.4=Q) = FD2SA(FD-.4=TI,BRESET_-=CD,U4.Q-.4=D,LDY-=TE,
        CP-=CP);
U4.3(U4.Q-.3=Q) = FD2SA(FD-.3=TI,BRESET_-=CD,U4.Q-.3=D,LDY-=TE,
        CP-=CP);
U4.2(U4.Q-.2=Q) = FD2SA(FD-.2=TI,BRESET_-=CD,U4.Q-.2=D,LDY-=TE,
        CP-=CP);
U4.1(U4.Q-.1=Q) = FD2SA(FD-.1=TI,BRESET_-=CD,U4.Q-.1=D,LDY-=TE,
        CP-=CP);
U4.0(U4.Q-.0=Q) = FD2SA(FD-.0=TI,BRESET_-=CD,U4.Q-.0=D,LDY-=TE,
        CP-=CP);
```

```
U3.15(U3.Z-.15=Z) = MUX41B(U9.Q-.15=D0,U5.Q-.15=D3,U6.Q-.15=D1,
        U4.Q-.15=D2,U3.B-=B,U3.A-=A);
U3.14(U3.Z-.14=Z) = MUX41B(U9.Q-.14=D0,U5.Q-.14=D3,U6.Q-.14=D1,
        U4.Q-.14=D2,U3.B-=B,U3.A-=A);
U3.13(U3.Z-.13=Z) = MUX41B(U9.Q-.13=D0,U5.Q-.13=D3,U6.Q-.13=D1,
        U4.Q-.13=D2,U3.B-=B,U3.A-=A);
U3.12(U3.Z-.12=Z) = MUX41B(U9.Q-.12=D0,U5.Q-.12=D3,U6.Q-.12=D1,
        U4.Q-.12=D2,U3.B-=B,U3.A-=A);
U3.11(U3.Z-.11=Z) = MUX41B(U9.Q-.11=D0,U5.Q-.11=D3,U6.Q-.11=D1,
        U4.Q-.11=D2,U3.B-=B,U3.A-=A);
U3.10(U3.Z-.10=Z) = MUX41B(U9.Q-.10=D0,U5.Q-.10=D3,U6.Q-.10=D1,
        U4.Q-.10=D2,U3.B-=B,U3.A-=A);
U3.9(U3.Z-.9=Z) = MUX41B(U9.Q-.9=D0,U5.Q-.9=D3,U6.Q-.9=D1,
        U4.Q-.9=D2,U3.B-=B,U3.A-=A);
U3.8(U3.Z-.8=Z) = MUX41B(U9.Q-.8=D0,U5.Q-.8=D3,U6.Q-.8=D1,
        U4.Q-.8=D2,U3.B-=B,U3.A-=A);
U3.7(U3.Z-.7=Z) = MUX41B(U9.Q-.7=D0,U5.Q-.7=D3,U6.Q-.7=D1,
        U4.Q-.7=D2,U3.B-=B,U3.A-=A);
U3.6(U3.Z-.6=Z) = MUX41B(U9.Q-.6=D0,U5.Q-.6=D3,U6.Q-.6=D1,
        U4.Q-.6=D2,U3.B-=B,U3.A-=A);
U3.5(U3.Z-.5=Z) = MUX41B(U9.Q-.5=D0,U5.Q-.5=D3,U6.Q-.5=D1,
        U4.Q-.5=D2,U3.B-=B,U3.A-=A);
U3.4(U3.Z-.4=Z) = MUX41B(U9.Q-.4=D0,U5.Q-.4=D3,U6.Q-.4=D1,
        U4.Q-.4=D2,U3.B-=B,U3.A-=A);
U3.3(U3.Z-.3=Z) = MUX41B(U9.Q-.3=D0,U5.Q-.3=D3,U6.Q-.3=D1,
        U4.Q-.3=D2,U3.B-=B,U3.A-=A);
U3.2(U3.Z-.2=Z) = MUX41B(U9.Q-.2=D0,U5.Q-.2=D3,U6.Q-.2=D1,
        U4.Q-.2=D2,U3.B-=B,U3.A-=A);
U3.1(U3.Z-.1=Z) = MUX41B(U9.Q-.1=D0,U5.Q-.1=D3,U6.Q-.1=D1,
        U4.Q-.1=D2,U3.B-=B,U3.A-=A);
U3.0(U3.Z-.0=Z) = MUX41B(U9.Q-.0=D0,U5.Q-.0=D3,U6.Q-.0=D1,
        U4.Q-.0=D2,U3.B-=B,U3.A-=A);
U1(DO-.7=Z.7,DO-.6=Z.6,DO-.5=Z.5,DO-.4=Z.4,DO-.3=Z.3,DO-.2=Z.2,
        DO-.1=Z.1,DO-.0=Z.0) = FRMLV2(BRESET_-=RESET_,CP-=CP,
        BWAIT-=WAIT,U1.SC-.7=SC.7,U1.SC-.6=SC.6,U1.SC-.5=SC.5,
        U1.SC-.4=SC.4,U1.SC-.3=SC.3,U1.SC-.2=SC.2,U1.SC-.1=SC.1,
        U1.SC-.0=SC.0,U1.LWS-.7=LWS.7,U1.LWS-.6=LWS.6,
        U1.LWS-.5=LWS.5,U1.LWS-.4=LWS.4,U1.LWS-.3=LWS.3,
        U1.LWS-.2=LWS.2,U1.LWS-.1=LWS.1,U1.LWS-.0=LWS.0,
        CNV-.7=CT.7,CNV-.6=CT.6,CNV-.5=CT.5,CNV-.4=CT.4,
        CNV-.3=CT.3,CNV-.2=CT.2,CNV-.1=CT.1,CNV-.0=CT.0);
U2(BWAIT-=Z) = B3A(WAIT-=A);
U16(U16.Z-=Z) = OR2B(OFF-=B,BWAIT-=A);
U0(LS-=LS_1,SPR-.1=SPR.1,SPR-.0=SPR.0) = OSSV1FN(BRESET_-=RESET_,
        U8.EN-=EN,U16.Z-=WAIT,CP-=CP,NS-.1=NS.1,NS-.0=NS.0);
U10.7(U10.Q-.15=Q) = FD2SA(U10.Q-.15=D,U10.TI-.7=TI,BRESET_-=CD,
        CP-=CP,LDH-=TE);
U10.6(U10.Q-.14=Q) = FD2SA(U10.Q-.14=D,U10.TI-.6=TI,BRESET_-=CD,
        CP-=CP,LDH-=TE);
U10.5(U10.Q-.13=Q) = FD2SA(U10.Q-.13=D,U10.TI-.5=TI,BRESET_-=CD,
        CP-=CP,LDH-=TE);
U10.4(U10.Q-.12=Q) = FD2SA(U10.Q-.12=D,U10.TI-.4=TI,BRESET_-=CD,
        CP-=CP,LDH-=TE);
U10.3(U10.Q-.11=Q) = FD2SA(U10.Q-.11=D,U10.TI-.3=TI,BRESET_-=CD,
        CP-=CP,LDH-=TE);
U10.2(U10.Q-.10=Q) = FD2SA(U10.Q-.10=D,U10.TI-.2=TI,BRESET_-=CD,
        CP-=CP,LDH-=TE);
U10.1(U10.Q-.9=Q) = FD2SA(U10.Q-.9=D,U10.TI-.1=TI,BRESET_-=CD,
        CP-=CP,LDH-=TE);
U10.0(U10.Q-.8=Q) = FD2SA(U10.Q-.8=D,U10.TI-.0=TI,BRESET_-=CD,
        CP-=CP,LDH-=TE);
U7(U7.CO-=CO) = CNTR8D(U8.CE-=CE,BRESET_-=RESET_,U7.D-.7=D.7,
        U7.D-.6=D.6,U7.D-.5=D.5,U7.D-.4=D.4,U7.D-.3=D.3,
        U7.D-.2=D.2,U7.D-.1=D.1,U7.D-.0=D.0,CP-=CP,LDH-=LD);
U8(MWAIT-=MWAIT,WE-=WE,U8.EN-=EN,U8.CE-=CE,FEAK_-=FEAK_,LDK-=LDK,
        LDY-=LDY,LDM-=LDM,LDC-=LDC,LDH-=LDH,RD_-=RD_) =
        MRGCNTV1FN(LWONLY-=LWONLY,CTONLY-=CTONLY,CTEFF-=CTEFF,
        U13.Z-=FNE,U11.Q-=FE,OFF-=OFF,STF-=STF,WAIT-=WAIT,
        REQ_O-=REQ_O,HDF-=HDF,LS-=LS_1,CP-=CP,U7.CO-=CO,
        BRESET_-=RESET_);


/* extractors ******************************/
```

```
    U10.Q-.15 = (HDF-);
    U10.Q-.10 = (CTONLY-);
    U10.Q-.9 = (LWONLY-);
    U10.Q-.8 = (CTEFF-);
    FD-.15 = (U10.TI-.7);
    FD-.14 = (U10.TI-.6);
    FD-.13 = (U10.TI-.5);
    FD-.12 = (U10.TI-.4);
    FD-.11 = (U10.TI-.3);
    FD-.10 = (U10.TI-.2);
    FD-.9 = (U10.TI-.1);
    FD-.8 = (U10.TI-.0);
    FD-.7 = (U7.D-.7);
    FD-.6 = (U7.D-.6);
    FD-.5 = (U7.D-.5);
    FD-.4 = (U7.D-.4);
    FD-.3 = (U7.D-.3);
    FD-.2 = (U7.D-.2);
    FD-.1 = (U7.D-.1);
    FD-.0 = (U7.D-.0);
    SPR-.1 = (U3.B-);
    SPR-.0 = (U3.A-);
    U3.Z-.15 = (U1.SC-.7);
    U3.Z-.14 = (U1.SC-.6);
    U3.Z-.13 = (U1.SC-.5);
    U3.Z-.12 = (U1.SC-.4);
    U3.Z-.11 = (U1.SC-.3);
    U3.Z-.10 = (U1.SC-.2);
    U3.Z-.9 = (U1.SC-.1);
    U3.Z-.8 = (U1.SC-.0);
    U3.Z-.7 = (U1.LWS-.7);
    U3.Z-.6 = (U1.LWS-.6);
    U3.Z-.5 = (U1.LWS-.5);
    U3.Z-.4 = (U1.LWS-.4);
    U3.Z-.3 = (U1.LWS-.3);
    U3.Z-.2 = (U1.LWS-.2);
    U3.Z-.1 = (U1.LWS-.1);
    U3.Z-.0 = (U1.LWS-.0);

  /* type converters *********************/

ANNOTATIONS
{
  BUS BUS_TYPE = "DOT";
}

END MODULE;


/* * * * * * *  Contents of NET file SRDLYAV.NET  * * * * * * */

/*******************************************************/
/*  Netlist copyright (C) 1989 LSI Logic Corporation  */
/*******************************************************/


MODULE SRDLYAV;

INPUTS      CP,D,DLY_POL,NOS.1,NOS.0,RESET_,WAIT;
OUTPUTS     Q0,QD;

LEVEL FUNCTION;
DEFINE
  /* implicit connectors *******************/

    QD- = (QD);
    DLY_POL- = (DLY_POL);
    NOS-.1 = (NOS.1);
    NOS-.0 = (NOS.0);
    D- = (D);
    D- = (D);
    Q0- = (Q0);
```

```
CP- = (CP);
WAIT- = (WAIT);
RESET_- = (RESET_);


/* part instances ***************************/

U1(QD-=Z) = MUX81HB(DLY_POL-=A,U1.C-=C,U1.B-=B,D-=D0,U1.D7-=D7,
        U1.D6-=D6,U1.D5-=D5,U1.D4-=D4,U1.D3-=D3,U1.D2-=D2,Q0-=D1);
U0(U0.Z-=Z) = B3A(WAIT-=A);
U2.19(U2.Q-.19=Q) = FD2SA(U2.D-.19=D,U2.Q-.19=TI,CP-=CP,RESET_-=CD,
        U0.Z-=TE);
U2.18(U2.Q-.18=Q) = FD2SA(U2.D-.18=D,U2.Q-.18=TI,CP-=CP,RESET_-=CD,
        U0.Z-=TE);
U2.17(U2.Q-.17=Q) = FD2SA(U2.D-.17=D,U2.Q-.17=TI,CP-=CP,RESET_-=CD,
        U0.Z-=TE);
U2.16(U2.Q-.16=Q) = FD2SA(U2.D-.16=D,U2.Q-.16=TI,CP-=CP,RESET_-=CD,
        U0.Z-=TE);
U2.15(U2.Q-.15=Q) = FD2SA(U2.D-.15=D,U2.Q-.15=TI,CP-=CP,RESET_-=CD,
        U0.Z-=TE);
U2.14(U2.Q-.14=Q) = FD2SA(U2.D-.14=D,U2.Q-.14=TI,CP-=CP,RESET_-=CD,
        U0.Z-=TE);
U2.13(U2.Q-.13=Q) = FD2SA(U2.D-.13=D,U2.Q-.13=TI,CP-=CP,RESET_-=CD,
        U0.Z-=TE);
U2.12(U2.Q-.12=Q) = FD2SA(U2.D-.12=D,U2.Q-.12=TI,CP-=CP,RESET_-=CD,
        U0.Z-=TE);
U2.11(U2.Q-.11=Q) = FD2SA(U2.D-.11=D,U2.Q-.11=TI,CP-=CP,RESET_-=CD,
        U0.Z-=TE);
U2.10(U2.Q-.10=Q) = FD2SA(U2.D-.10=D,U2.Q-.10=TI,CP-=CP,RESET_-=CD,
        U0.Z-=TE);
U2.9(U2.Q-.9=Q) = FD2SA(U2.D-.9=D,U2.Q-.9=TI,CP-=CP,RESET_-=CD,
        U0.Z-=TE);
U2.8(U2.Q-.8=Q) = FD2SA(U2.D-.8=D,U2.Q-.8=TI,CP-=CP,RESET_-=CD,
        U0.Z-=TE);
U2.7(U2.Q-.7=Q) = FD2SA(U2.D-.7=D,U2.Q-.7=TI,CP-=CP,RESET_-=CD,
        U0.Z-=TE);
U2.6(U2.Q-.6=Q) = FD2SA(U2.D-.6=D,U2.Q-.6=TI,CP-=CP,RESET_-=CD,
        U0.Z-=TE);
U2.5(U2.Q-.5=Q) = FD2SA(U2.D-.5=D,U2.Q-.5=TI,CP-=CP,RESET_-=CD,
        U0.Z-=TE);
U2.4(U2.Q-.4=Q) = FD2SA(U2.D-.4=D,U2.Q-.4=TI,CP-=CP,RESET_-=CD,
        U0.Z-=TE);
U2.3(U2.Q-.3=Q) = FD2SA(U2.D-.3=D,U2.Q-.3=TI,CP-=CP,RESET_-=CD,
        U0.Z-=TE);
U2.2(U2.Q-.2=Q) = FD2SA(U2.D-.2=D,U2.Q-.2=TI,CP-=CP,RESET_-=CD,
        U0.Z-=TE);
U2.1(U2.Q-.1=Q) = FD2SA(U2.D-.1=D,U2.Q-.1=TI,CP-=CP,RESET_-=CD,
        U0.Z-=TE);
U2.0(U2.Q-.0=Q) = FD2SA(U2.D-.0=D,U2.Q-.0=TI,CP-=CP,RESET_-=CD,
        U0.Z-=TE);


/* extractors ******************************/

NOS-.1 = (U1.C-);
NOS-.0 = (U1.B-);
U2.Q-.18 = (M-0.18);
U2.Q-.17 = (M-0.17);
U2.Q-.16 = (M-0.16);
U2.Q-.15 = (M-0.15);
U2.Q-.14 = (M-0.14);
U2.Q-.13 = (M-0.13);
U2.Q-.12 = (M-0.12);
U2.Q-.11 = (M-0.11);
U2.Q-.10 = (M-0.10);
U2.Q-.9 = (M-0.9);
U2.Q-.8 = (M-0.8);
U2.Q-.7 = (M-0.7);
U2.Q-.6 = (M-0.6);
U2.Q-.5 = (M-0.5);
U2.Q-.4 = (M-0.4);
U2.Q-.3 = (M-0.3);
U2.Q-.2 = (M-0.2);
U2.Q-.1 = (M-0.1);
```

```
    U2.Q-.0 = (M-0.0);
    U2.D-.19 = (M-0.18);
    U2.D-.18 = (M-0.17);
    U2.D-.17 = (M-0.16);
    U2.D-.16 = (M-0.15);
    U2.D-.15 = (M-0.14);
    U2.D-.14 = (M-0.13);
    U2.D-.13 = (M-0.12);
    U2.D-.12 = (M-0.11);
    U2.D-.11 = (M-0.10);
    U2.D-.10 = (M-0.9);
    U2.D-.9 = (M-0.8);
    U2.D-.8 = (M-0.7);
    U2.D-.7 = (M-0.6);
    U2.D-.6 = (M-0.5);
    U2.D-.5 = (M-0.4);
    U2.D-.4 = (M-0.3);
    U2.D-.3 = (M-0.2);
    U2.D-.2 = (M-0.1);
    U2.D-.1 = (M-0.0);
    U2.D-.0 = (D-);
    U2.Q-.15 = (U1.D6-);
    U2.Q-.13 = (U1.D5-);
    U2.Q-.10 = (U1.D4-);
    U2.Q-.6 = (U1.D3-);
    U2.Q-.5 = (U1.D2-);
    U2.Q-.1 = (Q0-);
    U2.Q-.19 = (U1.D7-);


  /* type converters *********************/

ANNOTATIONS
{
  BUS BUS_TYPE = "DOT";
}

END MODULE;


/* * * * * * *  Contents of NET file ADD13F.NET  * * * * * * */

/*******************************************************/
/*  Netlist copyright (C) 1989 LSI Logic Corporation  */
/*******************************************************/


MODULE ADD13F;

INPUTS       A.12,A.11,A.10,A.9,A.8,A.7,A.6,A.5,A.4,A.3,A.2,A.1,
             A.0,B.12,B.11,B.10,B.9,B.8,B.7,B.6,B.5,B.4,B.3,B.2,
             B.1,B.0;
OUTPUTS      S.13,S.12,S.11,S.10,S.9,S.8,S.7,S.6,S.5,S.4,S.3,S.2,
             S.1,S.0;

LEVEL FUNCTION;
DEFINE
  /* implicit connectors ******************/

    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
    S-.13 = (S.13);
```

```
S-.12 = (S.12);
S-.11 = (S.11);
S-.10 = (S.10);
S-.9 = (S.9);
S-.8 = (S.8);
S-.7 = (S.7);
S-.6 = (S.6);
S-.5 = (S.5);
S-.4 = (S.4);
S-.3 = (S.3);
S-.2 = (S.2);
S-.1 = (S.1);
S-.0 = (S.0);
A-.12 = (A.12);
A-.11 = (A.11);
A-.10 = (A.10);
A-.9 = (A.9);
A-.8 = (A.8);
A-.7 = (A.7);
A-.6 = (A.6);
A-.5 = (A.5);
A-.4 = (A.4);
A-.3 = (A.3);
A-.2 = (A.2);
A-.1 = (A.1);
A-.0 = (A.0);

/* part instances ***************************/

U5(U5.Z-=Z) = AND2B(U4.P-=A,U7.P-=B);
U11(U11.Z-=Z) = N1B(U10.Z-=A);
U9(U9.Z-=Z) = ND2C(U6.Z-=A,U11.Z-=B);
U6(U6.Z-=Z) = ND2B(U5.Z-=B,U15.Z-=A);
U14(U14.Z-=Z) = N1C(U0.G-=A);
U15(U15.Z-=Z) = ND2C(U14.Z-=B,U13.Z-=A);
U13(U13.Z-=Z) = ND2C(U0.P-=B,U1.G-=A);
U1(U1.G-=G,U1.SUM3-=SUM3,U1.SUM2-=SUM2,U1.SUM1-=SUM1,U1.SUM0-=SUM0)
          = ADD15F0_SEL4(U1.A0-=A0,U1.A1-=A1,U1.A2-=A2,U1.A3-=A3,
        U1.B0-=B0,U1.B1-=B1,U1.B2-=B2,U1.B3-=B3);
U7(U7.SUM0-=SUM0,U7.G-=G,U7.P-=P) = ADD_SEL1(U3.Z-=CI,U7.A0-=A0,
        U7.B0-=B0);
U12(U12.Z-=Z) = N1C(U7.G-=A);
U10(U10.Z-=Z) = ND2C(U12.Z-=B,U8.Z-=A);
U8(U8.Z-=Z) = ND2C(U4.G-=A,U7.P-=B);
U16(U16.Z-=Z) = N1A(U4.G-=A);
U3(U3.Z-=Z) = ND2B(U16.Z-=B,U2.Z-=A);
U2(U2.Z-=Z) = ND2B(U4.P-=B,U15.Z-=A);
U4(U4.SUM1-=SUM1,U4.SUM2-=SUM2,U4.SUM3-=SUM3,U4.SUM0-=SUM0,
        U4.G-=G,U4.P-=P) = ADD_SEL4(U15.Z-=CI,U4.B3-=B3,U4.B1-=B1,
        U4.B2-=B2,U4.B0-=B0,U4.A0-=A0,U4.A1-=A1,U4.A2-=A2,
        U4.A3-=A3);
U0(U0.SUM1-=SUM1,U0.SUM2-=SUM2,U0.SUM0-=SUM0,U0.G-=G,U0.P-=P,
        U0.SUM3-=SUM3) = ADD_SEL4(U1.G-=CI,U0.B1-=B1,U0.B2-=B2,
        U0.B3-=B3,U0.B0-=B0,U0.A0-=A0,U0.A1-=A1,U0.A2-=A2,
        U0.A3-=A3);

/* extractors *****************************/

A-.4 = (U0.A0-);
A-.6 = (U0.A2-);
A-.7 = (U0.A3-);
M-0.4 = (U0.SUM0-);
M-0.6 = (U0.SUM2-);
M-0.5 = (U0.SUM1-);
M-0.9 = (U4.SUM1-);
M-0.11 = (U4.SUM3-);
M-0.8 = (U4.SUM0-);
M-0.12 = (U7.SUM0-);
A-.12 = (U7.A0-);
B-.8 = (U4.B0-);
B-.11 = (U4.B3-);
B-.4 = (U0.B0-);
```

```
    B-.9 = (U4.B1-);
    B-.6 = (U0.B2-);
    B-.7 = (U0.B3-);
    B-.10 = (U4.B2-);
    B-.5 = (U0.B1-);
    S-.12 = (M-0.12);
    S-.11 = (M-0.11);
    S-.10 = (M-0.10);
    S-.9 = (M-0.9);
    S-.8 = (M-0.8);
    S-.7 = (M-0.7);
    S-.6 = (M-0.6);
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    S-.13 = (U9.Z-);
    A-.0 = (U1.A0-);
    A-.1 = (U1.A1-);
    A-.2 = (U1.A2-);
    A-.3 = (U1.A3-);
    B-.0 = (U1.B0-);
    B-.1 = (U1.B1-);
    B-.3 = (U1.B3-);
    M-0.3 = (U1.SUM3-);
    M-0.2 = (U1.SUM2-);
    M-0.1 = (U1.SUM1-);
    M-0.0 = (U1.SUM0-);
    B-.2 = (U1.B2-);
    B-.12 = (U7.B0-);
    A-.8 = (U4.A0-);
    A-.9 = (U4.A1-);
    A-.10 = (U4.A2-);
    A-.11 = (U4.A3-);
    M-0.10 = (U4.SUM2-);
    M-0.7 = (U0.SUM3-);
    A-.5 = (U0.A1-);

  /* type converters *********************/

ANNOTATIONS
{
  BUS BUS_TYPE = "DOT";
}

END MODULE;


/* * * * * * *  Contents of NET file ADD_SEL1.NET  * * * * * * */

/******************************************************/
/*  Netlist copyright (C) 1989 LSI Logic Corporation  */
/******************************************************/


MODULE ADD_SEL1;

INPUTS      A0,B0,CI;
OUTPUTS     G,P,SUM0;

LEVEL FUNCTION;
DEFINE
  /* implicit connectors *******************/

    SUM0- = (SUM0);
    G- = (G);
    A0- = (A0);
    B0- = (B0);
    P- = (P);
    CI- = (CI);
```

```
/* part instances ***************************/

  U15(G-=Z) = N1C(U12.Z-=A);
  U12(U12.Z-=Z) = ND2C(B0-=B,A0-=A);
  U10(U10.Z-=Z) = NR2C(A0-=A,B0-=B);
  U11(P-=Z) = N1B(U10.Z-=A);
  U1(U1.Z-=Z) = N1B(U10.Z-=A);
  U2(U2.Z-=Z) = ND2B(U12.Z-=A,U1.Z-=B);
  U3(U3.Z-=Z) = N1C(U2.Z-=A);
  U7(SUM0-=Z) = MX21LB(U0.Z-=S,U3.Z-=A,U2.Z-=B);
  U0(U0.Z-=Z) = N1D(CI-=A);


/* extractors ******************************/


/* type converters *********************/

ANNOTATIONS
{
 BUS BUS_TYPE = "DOT";
}

END MODULE;


/* * * * * * *  Contents of NET file ADD15F.NET  * * * * * * */

/******************************************************/
/*  Netlist copyright (C) 1989 LSI Logic Corporation  */
/******************************************************/


MODULE ADD15F;

INPUTS      A.14,A.13,A.12,A.11,A.10,A.9,A.8,A.7,A.6,A.5,A.4,A.3,
            A.2,A.1,A.0,B.14,B.13,B.12,B.11,B.10,B.9,B.8,B.7,B.6,
            B.5,B.4,B.3,B.2,B.1,B.0;
OUTPUTS     S.15,S.14,S.13,S.12,S.11,S.10,S.9,S.8,S.7,S.6,S.5,S.4,
            S.3,S.2,S.1,S.0;

LEVEL FUNCTION;
DEFINE
 /* implicit connectors *******************/

   S-.15 = (S.15);
   S-.14 = (S.14);
   S-.13 = (S.13);
   S-.12 = (S.12);
   S-.11 = (S.11);
   S-.10 = (S.10);
   S-.9 = (S.9);
   S-.8 = (S.8);
   S-.7 = (S.7);
   S-.6 = (S.6);
   S-.5 = (S.5);
   S-.4 = (S.4);
   S-.3 = (S.3);
   S-.2 = (S.2);
   S-.1 = (S.1);
   S-.0 = (S.0);
   B-.14 = (B.14);
   B-.13 = (B.13);
   B-.12 = (B.12);
   B-.11 = (B.11);
   B-.10 = (B.10);
   B-.9 = (B.9);
   B-.8 = (B.8);
   B-.7 = (B.7);
   B-.6 = (B.6);
   B-.5 = (B.5);
```

```
B-.4 = (B.4);
B-.3 = (B.3);
B-.2 = (B.2);
B-.1 = (B.1);
B-.0 = (B.0);
A-.14 = (A.14);
A-.13 = (A.13);
A-.12 = (A.12);
A-.11 = (A.11);
A-.10 = (A.10);
A-.9 = (A.9);
A-.8 = (A.8);
A-.7 = (A.7);
A-.6 = (A.6);
A-.5 = (A.5);
A-.4 = (A.4);
A-.3 = (A.3);
A-.2 = (A.2);
A-.1 = (A.1);
A-.0 = (A.0);


/* part instances ***************************/

U15(U15.Z-=Z) = ND2C(U0.G-=A,U18.P-=B);
U10(U10.Z-=Z) = N1C(U9.G-=A);
U8(U8.Z-=Z) = N1B(U7.Z-=A);
U7(U7.Z-=Z) = ND2C(U6.Z-=A,U10.Z-=B);
U6(U6.Z-=Z) = ND2C(U9.P-=B,U1.G-=A);
U12(U12.Z-=Z) = ND2B(U16.Z-=A,U1.P-=B);
U2(U2.Z-=Z) = AND2B(U9.P-=B,U1.P-=A);
U5(U5.Z-=Z) = ND2B(U16.Z-=A,U2.Z-=B);
U4(U4.Z-=Z) = ND2C(U8.Z-=B,U5.Z-=A);
U0(U0.SUM0-=SUM0,U0.SUM1-=SUM1,U0.SUM2-=SUM2,U0.SUM3-=SUM3,
        U0.G-=G) = ADD15F0_SEL4(U0.B3-=B3,U0.B2-=B2,U0.B1-=B1,
        U0.B0-=B0,U0.A3-=A3,U0.A2-=A2,U0.A1-=A1,U0.A0-=A0);
U18(U18.SUM3-=SUM3,U18.P-=P,U18.G-=G,U18.SUM0-=SUM0,U18.SUM2-=SUM2,
        U18.SUM1-=SUM1) = ADD_SEL4(U18.A3-=A3,U18.A2-=A2,
        U18.A1-=A1,U18.A0-=A0,U18.B0-=B0,U18.B3-=B3,U18.B2-=B2,
        U18.B1-=B1,U0.G-=CI);
U17(U17.Z-=Z) = N1C(U18.G-=A);
U16(U16.Z-=Z) = ND2C(U15.Z-=A,U17.Z-=B);
U1(U1.P-=P,U1.G-=G,U1.SUM0-=SUM0,U1.SUM3-=SUM3,U1.SUM2-=SUM2,
        U1.SUM1-=SUM1) = ADD_SEL4(U1.A3-=A3,U1.A2-=A2,U1.A1-=A1,
        U1.A0-=A0,U1.B0-=B0,U1.B2-=B2,U1.B1-=B1,U1.B3-=B3,
        U16.Z-=CI);
U13(U13.Z-=Z) = N1A(U1.G-=A);
U11(U11.Z-=Z) = ND2B(U12.Z-=A,U13.Z-=B);
U9(U9.P-=P,U9.G-=G,U9.SUM0-=SUM0,U9.SUM2-=SUM2,U9.SUM1-=SUM1)
         = ADD15F_SEL3(U9.B0-=B0,U9.B1-=B1,U9.B2-=B2,U9.A2-=A2,
        U9.A1-=A1,U9.A0-=A0,U11.Z-=CI);


/* extractors ****************************/

A-.14 = (U9.A2-);
A-.13 = (U9.A1-);
A-.11 = (U1.A3-);
A-.10 = (U1.A2-);
A-.9 = (U1.A1-);
A-.8 = (U1.A0-);
A-.7 = (U18.A3-);
A-.6 = (U18.A2-);
A-.5 = (U18.A1-);
A-.4 = (U18.A0-);
M-0.10 = (U1.SUM2-);
M-0.8 = (U1.SUM0-);
M-0.4 = (U18.SUM0-);
M-0.12 = (U9.SUM0-);
M-0.5 = (U18.SUM1-);
M-0.1 = (U0.SUM1-);
M-0.2 = (U0.SUM2-);
M-0.0 = (U0.SUM0-);
S-.15 = (U4.Z-);
```

```
    S-.14 = (M-0.14);
    S-.13 = (M-0.13);
    S-.12 = (M-0.12);
    S-.11 = (M-0.11);
    S-.10 = (M-0.10);
    S-.9 = (M-0.9);
    S-.8 = (M-0.8);
    S-.7 = (M-0.7);
    S-.6 = (M-0.6);
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    M-0.14 = (U9.SUM2-);
    M-0.9 = (U1.SUM1-);
    M-0.7 = (U18.SUM3-);
    M-0.11 = (U1.SUM3-);
    M-0.13 = (U9.SUM1-);
    M-0.6 = (U18.SUM2-);
    M-0.3 = (U0.SUM3-);
    B-.3 = (U0.B3-);
    B-.7 = (U18.B3-);
    B-.14 = (U9.B2-);
    B-.2 = (U0.B2-);
    B-.1 = (U0.B1-);
    B-.9 = (U1.B1-);
    B-.11 = (U1.B3-);
    B-.8 = (U1.B0-);
    B-.10 = (U1.B2-);
    B-.12 = (U9.B0-);
    B-.6 = (U18.B2-);
    B-.5 = (U18.B1-);
    B-.13 = (U9.B1-);
    B-.4 = (U18.B0-);
    B-.0 = (U0.B0-);
    A-.3 = (U0.A3-);
    A-.2 = (U0.A2-);
    A-.1 = (U0.A1-);
    A-.0 = (U0.A0-);
    A-.12 = (U9.A0-);

  /* type converters *********************/

ANNOTATIONS
{
  BUS BUS_TYPE = "DOT";
}

END MODULE;


/* * * * * * *  Contents of NET file ADD15F_SEL3.NET  * * * * * * */

/******************************************************/
/*  Netlist copyright (C) 1989 LSI Logic Corporation  */
/******************************************************/


MODULE ADD15F_SEL3;

INPUTS      A0,A1,A2,B0,B1,B2,CI;
OUTPUTS     G,P,SUM0,SUM1,SUM2;

LEVEL FUNCTION;
DEFINE
  /* implicit connectors ******************/

    A0- = (A0);
    G- = (G);
    A2- = (A2);
```

```
  B2- = (B2);
  P- = (P);
  B1- = (B1);
  A1- = (A1);
  SUM1- = (SUM1);
  SUM0- = (SUM0);
  CI- = (CI);
  SUM2- = (SUM2);
  B0- = (B0);

 /* part instances ***************************/

  U2(U2.Z-=Z) = ND2C(B0-=B,A0-=A);
  U36(U36.Z-=Z) = N1B(U17.Z-=A);
  U8(U8.Z-=Z) = ND2C(B2-=B,A2-=A);
  U9(U9.Z-=Z) = NR2C(A2-=A,B2-=B);
  U3(U3.Z-=Z) = N1B(U9.Z-=A);
  U22(U22.Z-=Z) = N1C(U9.Z-=A);
  U13(U13.Z-=Z) = AO7B(U2.Z-=A,U6.Z-=B,U1.Z-=C);
  U1(U1.Z-=Z) = ND2C(B1-=B,A1-=A);
  U6(U6.Z-=Z) = NR2C(A1-=A,B1-=B);
  U15(U15.Z-=Z) = N1B(U6.Z-=A);
  U7(U7.Z-=Z) = NR2C(U6.Z-=A,U4.Z-=B);
  U5(U5.Z-=Z) = N1C(U7.Z-=A);
  U33(P-=Z) = AND2B(U22.Z-=B,U7.Z-=A);
  U26(U26.Z-=Z) = ND2B(U13.Z-=B,U22.Z-=A);
  U32(G-=Z) = ND2C(U26.Z-=A,U8.Z-=B);
  U17(U17.Z-=Z) = ND2B(U3.Z-=B,U8.Z-=A);
  U35(U35.Z-=Z) = MX21LA(U13.Z-=S,U36.Z-=A,U17.Z-=B);
  U28(U28.Z-=Z) = EOB(U27.Z-=A,U16.Z-=B);
  U30(SUM1-=Z) = MX21LB(U29.Z-=B,U28.Z-=A,U20.Z-=S);
  U21(U21.Z-=Z) = N1C(U25.Z-=A);
  U31(SUM0-=Z) = MX21LB(U21.Z-=A,U20.Z-=S,U25.Z-=B);
  U20(U20.Z-=Z) = N1D(CI-=A);
  U18(SUM2-=Z) = MX21LB(U35.Z-=B,U19.Z-=A,U20.Z-=S);
  U19(U19.Z-=Z) = MX21LA(U36.Z-=A,U17.Z-=B,U14.Z-=S);
  U14(U14.Z-=Z) = ND2C(U5.Z-=B,U1.Z-=A);
  U27(U27.Z-=Z) = ND2B(U15.Z-=B,U1.Z-=A);
  U29(U29.Z-=Z) = ENB(U2.Z-=A,U27.Z-=B);
  U25(U25.Z-=Z) = ND2B(U16.Z-=B,U2.Z-=A);
  U16(U16.Z-=Z) = N1B(U4.Z-=A);
  U4(U4.Z-=Z) = NR2C(A0-=A,B0-=B);

 /* extractors ******************************/


 /* type converters *********************/

ANNOTATIONS
{
 BUS BUS_TYPE = "DOT";
}

END MODULE;


/* * * * * * *  Contents of NET file ADD15F0_SEL4.NET  * * * * * * */

/*******************************************************/
/*  Netlist copyright (C) 1989 LSI Logic Corporation  */
/*******************************************************/


MODULE ADD15F0_SEL4;

INPUTS      A0,A1,A2,A3,B0,B1,B2,B3;
OUTPUTS     G,SUM0,SUM1,SUM2,SUM3;
```

```
LEVEL FUNCTION;
DEFINE
  /* implicit connectors *******************/

    G- = (G);
    SUM2- = (SUM2);
    SUM1- = (SUM1);
    B1- = (B1);
    A1- = (A1);
    A0- = (A0);
    B0- = (B0);
    SUM0- = (SUM0);
    SUM3- = (SUM3);
    B2- = (B2);
    A2- = (A2);
    B3- = (B3);
    A3- = (A3);


  /* part instances ***************************/

    U30(SUM2-=Z) = N1C(U26.Z-=A);
    U29(SUM1-=Z) = N1C(U8.Z-=A);
    U14(U14.Z-=Z) = ND2C(B1-=B,A1-=A);
    U9(U9.Z-=Z) = NR2C(A1-=A,B1-=B);
    U4(U4.Z-=Z) = N1B(U9.Z-=A);
    U7(U7.Z-=Z) = ND2B(U14.Z-=A,U4.Z-=B);
    U8(U8.Z-=Z) = ENB(U7.Z-=B,U15.Z-=A);
    U28(SUM0-=Z) = N1C(U6.Z-=A);
    U6(U6.Z-=Z) = ND2B(U15.Z-=A,U5.Z-=B);
    U5(U5.Z-=Z) = N1B(U10.Z-=A);
    U10(U10.Z-=Z) = NR2C(A0-=A,B0-=B);
    U15(U15.Z-=Z) = ND2C(B0-=B,A0-=A);
    U17(U17.Z-=Z) = AO7B(U14.Z-=C,U9.Z-=B,U15.Z-=A);
    U31(SUM3-=Z) = N1C(U25.Z-=A);
    U23(U23.Z-=Z) = EOB(U22.Z-=B,U11.Z-=A);
    U25(U25.Z-=Z) = MX21LA(U23.Z-=A,U24.Z-=B,U17.Z-=S);
    U26(U26.Z-=Z) = MX21LA(U20.Z-=B,U21.Z-=A,U17.Z-=S);
    U21(U21.Z-=Z) = N1B(U20.Z-=A);
    U20(U20.Z-=Z) = ND2B(U11.Z-=A,U12.Z-=B);
    U13(U13.Z-=Z) = NR2C(A2-=A,B2-=B);
    U11(U11.Z-=Z) = ND2C(B2-=B,A2-=A);
    U2(U2.Z-=Z) = AO7A(U16.Z-=C,U11.Z-=A,U19.Z-=B);
    U0(U0.Z-=Z) = N1C(U2.Z-=A);
    U27(G-=Z) = ND2C(U3.Z-=A,U0.Z-=B);
    U3(U3.Z-=Z) = ND2B(U1.Z-=A,U17.Z-=B);
    U1(U1.Z-=Z) = NR2C(U19.Z-=B,U13.Z-=A);
    U12(U12.Z-=Z) = N1B(U13.Z-=A);
    U24(U24.Z-=Z) = ENB(U12.Z-=B,U22.Z-=A);
    U22(U22.Z-=Z) = ND2C(U18.Z-=B,U16.Z-=A);
    U18(U18.Z-=Z) = N1B(U19.Z-=A);
    U19(U19.Z-=Z) = NR2C(A3-=A,B3-=B);
    U16(U16.Z-=Z) = ND2C(B3-=B,A3-=A);


  /* extractors ******************************/


  /* type converters *********************/

ANNOTATIONS
{
  BUS BUS_TYPE = "DOT";
}

END MODULE;

/* * * * * * *  Contents of NET file ADD_SEL4.NET  * * * * * * */

/*******************************************************/
/*  Netlist copyright (C) 1989 LSI Logic Corporation  */
/*******************************************************/
```

```
MODULE ADD_SEL4;

INPUTS      A0,A1,A2,A3,B0,B1,B2,B3,CI;
OUTPUTS     G,P,SUM0,SUM1,SUM2,SUM3;

LEVEL FUNCTION;
DEFINE
  /* implicit connectors *******************/

    A1- = (A1);
    SUM1- = (SUM1);
    G- = (G);
    A3- = (A3);
    B3- = (B3);
    P- = (P);
    A2- = (A2);
    SUM3- = (SUM3);
    SUM2- = (SUM2);
    B2- = (B2);
    A0- = (A0);
    B0- = (B0);
    CI- = (CI);
    SUM0- = (SUM0);
    B1- = (B1);


  /* part instances ***************************/

    U10(U10.Z-=Z) = NR2C(B3-=B,A3-=A);
    U15(U15.Z-=Z) = ND2C(B3-=B,A3-=A);
    U39(P-=Z) = AND2B(U18.Z-=B,U2.Z-=A);
    U18(U18.Z-=Z) = NR2C(U9.Z-=A,U10.Z-=B);
    U40(SUM3-=Z) = MX21LB(U25.Z-=S,U38.Z-=B,U36.Z-=A);
    U35(U35.Z-=Z) = EOB(U11.Z-=B,U7.Z-=A);
    U38(U38.Z-=Z) = MX21LA(U35.Z-=A,U37.Z-=B,U16.Z-=S);
    U36(U36.Z-=Z) = MX21LA(U3.Z-=S,U35.Z-=A,U37.Z-=B);
    U34(U34.Z-=Z) = MX21LA(U8.Z-=B,U33.Z-=A,U16.Z-=S);
    U32(SUM2-=Z) = MX21LB(U25.Z-=S,U31.Z-=A,U34.Z-=B);
    U31(U31.Z-=Z) = MX21LA(U3.Z-=S,U8.Z-=B,U33.Z-=A);
    U33(U33.Z-=Z) = N1B(U8.Z-=A);
    U8(U8.Z-=Z) = ND2B(U7.Z-=A,U12.Z-=B);
    U7(U7.Z-=Z) = ND2C(B2-=B,A2-=A);
    U9(U9.Z-=Z) = NR2C(B2-=B,A2-=A);
    U12(U12.Z-=Z) = N1B(U9.Z-=A);
    U37(U37.Z-=Z) = ENB(U12.Z-=B,U11.Z-=A);
    U11(U11.Z-=Z) = ND2C(U17.Z-=B,U15.Z-=A);
    U17(U17.Z-=Z) = N1B(U10.Z-=A);
    U20(U20.Z-=Z) = AO7A(U15.Z-=C,U7.Z-=A,U10.Z-=B);
    U23(U23.Z-=Z) = N1C(U20.Z-=A);
    U28(G-=Z) = ND2C(U22.Z-=A,U23.Z-=B);
    U22(U22.Z-=Z) = ND2B(U18.Z-=A,U16.Z-=B);
    U16(U16.Z-=Z) = AO7B(U14.Z-=C,U0.Z-=B,U13.Z-=A);
    U3(U3.Z-=Z) = ND2C(U6.Z-=B,U14.Z-=A);
    U6(U6.Z-=Z) = N1C(U2.Z-=A);
    U2(U2.Z-=Z) = NR2C(U1.Z-=B,U0.Z-=A);
    U13(U13.Z-=Z) = ND2C(B0-=B,A0-=A);
    U1(U1.Z-=Z) = NR2C(B0-=B,A0-=A);
    U4(U4.Z-=Z) = N1B(U1.Z-=A);
    U26(U26.Z-=Z) = EOB(U4.Z-=B,U21.Z-=A);
    U30(SUM1-=Z) = MX21LB(U25.Z-=S,U26.Z-=A,U27.Z-=B);
    U25(U25.Z-=Z) = N1D(CI-=A);
    U29(SUM0-=Z) = MX21LB(U19.Z-=B,U25.Z-=S,U24.Z-=A);
    U24(U24.Z-=Z) = N1C(U19.Z-=A);
    U19(U19.Z-=Z) = ND2B(U13.Z-=A,U4.Z-=B);
    U27(U27.Z-=Z) = ENB(U21.Z-=B,U13.Z-=A);
    U21(U21.Z-=Z) = ND2B(U14.Z-=A,U5.Z-=B);
    U5(U5.Z-=Z) = N1B(U0.Z-=A);
    U0(U0.Z-=Z) = NR2C(B1-=B,A1-=A);
    U14(U14.Z-=Z) = ND2C(B1-=B,A1-=A);


  /* extractors ******************************/
```

```
  /* type converters ********************/

ANNOTATIONS
{
  BUS BUS_TYPE = "DOT";
}

END MODULE;


/* * * * * * *  Contents of NET file ADD_SEL2.NET  * * * * * * */

/****************************************************/
/*  Netlist copyright (C) 1989 LSI Logic Corporation  */
/****************************************************/


MODULE ADD_SEL2;

INPUTS       A0,A1,B0,B1,CI;
OUTPUTS      G,P,SUM0,SUM1;

LEVEL FUNCTION;
DEFINE
  /* implicit connectors *******************/

    B1- = (B1);
    G- = (G);
    SUM1- = (SUM1);
    P- = (P);
    CI- = (CI);
    SUM0- = (SUM0);
    B0- = (B0);
    A0- = (A0);
    A1- = (A1);


  /* part instances *************************/

    U12(U12.Z-=Z) = N1D(CI-=A);
    U9(U9.Z-=Z) = N1C(U7.Z-=A);
    U11(SUM0-=Z) = MX21LB(U7.Z-=B,U12.Z-=S,U9.Z-=A);
    U7(U7.Z-=Z) = ND2B(U5.Z-=B,U21.Z-=A);
    U5(U5.Z-=Z) = N1B(U1.Z-=A);
    U21(U21.Z-=Z) = ND2C(B0-=B,A0-=A);
    U1(U1.Z-=Z) = NR2C(B0-=B,A0-=A);
    U2(P-=Z) = NR2C(U1.Z-=B,U0.Z-=A);
    U6(U6.Z-=Z) = N1B(U0.Z-=A);
    U13(U13.Z-=Z) = ND2B(U6.Z-=B,U19.Z-=A);
    U14(U14.Z-=Z) = EOB(U5.Z-=B,U13.Z-=A);
    U15(SUM1-=Z) = MX21LB(U12.Z-=S,U14.Z-=A,U25.Z-=B);
    U25(U25.Z-=Z) = ENB(U13.Z-=B,U21.Z-=A);
    U22(G-=Z) = AO7B(U19.Z-=C,U0.Z-=B,U21.Z-=A);
    U19(U19.Z-=Z) = ND2C(B1-=B,A1-=A);
    U0(U0.Z-=Z) = NR2C(B1-=B,A1-=A);


  /* extractors *****************************/


  /* type converters ********************/

ANNOTATIONS
{
  BUS BUS_TYPE = "DOT";
}

END MODULE;


/* * * * * * *  Contents of NET file ADD14F.NET  * * * * * * */
```

```
/********************************************************/
/*  Netlist copyright (C) 1989 LSI Logic Corporation  */
/********************************************************/


MODULE ADD14F;

INPUTS      A.13,A.12,A.11,A.10,A.9,A.8,A.7,A.6,A.5,A.4,A.3,A.2,
            A.1,A.0,B.13,B.12,B.11,B.10,B.9,B.8,B.7,B.6,B.5,B.4,
            B.3,B.2,B.1,B.0;
OUTPUTS     S.14,S.13,S.12,S.11,S.10,S.9,S.8,S.7,S.6,S.5,S.4,S.3,
            S.2,S.1,S.0;

LEVEL FUNCTION;
DEFINE
  /* implicit connectors *******************/

    S-.14 = (S.14);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    B-.13 = (B.13);
    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);


  /* part instances **************************/

    U3(U3.Z-=Z) = N1C(U2.G-=A);
    U11(U11.Z-=Z) = N1C(U10.G-=A);
    U14(U14.Z-=Z) = ND2C(U9.Z-=A,U11.Z-=B);
    U15(U15.Z-=Z) = N1B(U14.Z-=A);
    U16(U16.Z-=Z) = ND2C(U15.Z-=B,U12.Z-=A);
    U12(U12.Z-=Z) = ND2B(U4.Z-=A,U13.Z-=B);
    U6(U6.Z-=Z) = ND2B(U4.Z-=A,U0.P-=B);
    U13(U13.Z-=Z) = AND2B(U10.P-=B,U0.P-=A);
    U9(U9.Z-=Z) = ND2C(U10.P-=B,U0.G-=A);
    U7(U7.Z-=Z) = N1A(U0.G-=A);
```

```
U5(U5.Z-=Z) = ND2B(U6.Z-=A,U7.Z-=B);
U10(U10.P-=P,U10.G-=G,U10.SUM0-=SUM0,U10.SUM1-=SUM1) = ADD_SEL2(
        U10.B0-=B0,U10.B1-=B1,U10.A1-=A1,U10.A0-=A0,U5.Z-=CI);
U8(U8.SUM0-=SUM0,U8.SUM1-=SUM1,U8.SUM2-=SUM2,U8.SUM3-=SUM3,
        U8.G-=G) = ADD15F0_SEL4(U8.B3-=B3,U8.B2-=B2,U8.B1-=B1,
        U8.B0-=B0,U8.A3-=A3,U8.A2-=A2,U8.A1-=A1,U8.A0-=A0);
U0(U0.P-=P,U0.G-=G,U0.SUM0-=SUM0,U0.SUM3-=SUM3,U0.SUM2-=SUM2,
        U0.SUM1-=SUM1) = ADD_SEL4(U0.A3-=A3,U0.A2-=A2,U0.A1-=A1,
        U0.A0-=A0,U0.B0-=B0,U0.B2-=B2,U0.B1-=B1,U0.B3-=B3,
        U4.Z-=CI);
U4(U4.Z-=Z) = ND2C(U1.Z-=A,U3.Z-=B);
U1(U1.Z-=Z) = ND2C(U8.G-=A,U2.P-=B);
U2(U2.SUM3-=SUM3,U2.P-=P,U2.G-=G,U2.SUM0-=SUM0,U2.SUM2-=SUM2,
        U2.SUM1-=SUM1) = ADD_SEL4(U2.A3-=A3,U2.A2-=A2,U2.A1-=A1,
        U2.A0-=A0,U2.B0-=B0,U2.B3-=B3,U2.B2-=B2,U2.B1-=B1,
        U8.G-=CI);


/* extractors *****************************/

 A-.7 = (U2.A3-);
 A-.5 = (U2.A1-);
 A-.4 = (U2.A0-);
 A-.11 = (U0.A3-);
 A-.10 = (U0.A2-);
 A-.9 = (U0.A1-);
 A-.8 = (U0.A0-);
 M-0.7 = (U2.SUM3-);
 M-0.8 = (U0.SUM0-);
 M-0.5 = (U2.SUM1-);
 M-0.11 = (U0.SUM3-);
 M-0.4 = (U2.SUM0-);
 M-0.0 = (U8.SUM0-);
 M-0.1 = (U8.SUM1-);
 M-0.3 = (U8.SUM3-);
 B-.10 = (U0.B2-);
 B-.5 = (U2.B1-);
 B-.8 = (U0.B0-);
 B-.4 = (U2.B0-);
 B-.6 = (U2.B2-);
 B-.1 = (U8.B1-);
 B-.12 = (U10.B0-);
 A-.13 = (U10.A1-);
 A-.12 = (U10.A0-);
 M-0.12 = (U10.SUM0-);
 M-0.13 = (U10.SUM1-);
 S-.13 = (M-0.13);
 S-.12 = (M-0.12);
 S-.11 = (M-0.11);
 S-.10 = (M-0.10);
 S-.9 = (M-0.9);
 S-.8 = (M-0.8);
 S-.7 = (M-0.7);
 S-.6 = (M-0.6);
 S-.5 = (M-0.5);
 S-.4 = (M-0.4);
 S-.3 = (M-0.3);
 S-.2 = (M-0.2);
 S-.1 = (M-0.1);
 S-.0 = (M-0.0);
 S-.14 = (U16.Z-);
 B-.13 = (U10.B1-);
 B-.2 = (U8.B2-);
 B-.7 = (U2.B3-);
 B-.3 = (U8.B3-);
 B-.9 = (U0.B1-);
 B-.11 = (U0.B3-);
 B-.0 = (U8.B0-);
 A-.3 = (U8.A3-);
 A-.2 = (U8.A2-);
 A-.1 = (U8.A1-);
 A-.0 = (U8.A0-);
 M-0.2 = (U8.SUM2-);
 M-0.10 = (U0.SUM2-);
```

```
    M-0.6 = (U2.SUM2-);
    M-0.9 = (U0.SUM1-);
    A-.6 = (U2.A2-);


  /* type converters *********************/

ANNOTATIONS
{
  BUS BUS_TYPE = "DOT";
}

END MODULE;


/* * * * * * * Contents of NET file DATA_MUXV2.NET  * * * * * * */

/******************************************************/
/*  Netlist copyright (C) 1989 LSI Logic Corporation   */
/******************************************************/


MODULE DATA_MUXV2;

INPUTS      CP,RC0.7,RC0.6,RC0.5,RC0.4,RC0.3,RC0.2,RC0.1,RC0.0,
            RC1.7,RC1.6,RC1.5,RC1.4,RC1.3,RC1.2,RC1.1,RC1.0,RC2.7,
            RC2.6,RC2.5,RC2.4,RC2.3,RC2.2,RC2.1,RC2.0,RC3.7,RC3.6,
            RC3.5,RC3.4,RC3.3,RC3.2,RC3.1,RC3.0,RC4.7,RC4.6,RC4.5,
            RC4.4,RC4.3,RC4.2,RC4.1,RC4.0,RESET_,S0.2,S0.1,S0.0,
            S1.2,S1.1,S1.0,S2.2,S2.1,S2.0,S3.2,S3.1,S3.0,S4.2,
            S4.1,S4.0,STB_I,WAIT;
OUTPUTS     D0.7,D0.6,D0.5,D0.4,D0.3,D0.2,D0.1,D0.0,D1.7,D1.6,
            D1.5,D1.4,D1.3,D1.2,D1.1,D1.0,D2.7,D2.6,D2.5,D2.4,
            D2.3,D2.2,D2.1,D2.0,D3.7,D3.6,D3.5,D3.4,D3.3,D3.2,
            D3.1,D3.0,D4.7,D4.6,D4.5,D4.4,D4.3,D4.2,D4.1,D4.0;

LEVEL FUNCTION;
DEFINE
  /* implicit connectors *******************/

    RESET_- = (RESET_);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC3-.7 = (RC3.7);
    RC3-.6 = (RC3.6);
    RC3-.5 = (RC3.5);
    RC3-.4 = (RC3.4);
    RC3-.3 = (RC3.3);
    RC3-.2 = (RC3.2);
    RC3-.1 = (RC3.1);
    RC3-.0 = (RC3.0);
    RC4-.7 = (RC4.7);
    RC4-.6 = (RC4.6);
    RC4-.5 = (RC4.5);
    RC4-.4 = (RC4.4);
    RC4-.3 = (RC4.3);
    RC4-.2 = (RC4.2);
    RC4-.1 = (RC4.1);
    RC4-.0 = (RC4.0);
    S2-.2 = (S2.2);
    S2-.1 = (S2.1);
    S2-.0 = (S2.0);
    D2-.7 = (D2.7);
    D2-.6 = (D2.6);
    D2-.5 = (D2.5);
    D2-.4 = (D2.4);
    D2-.3 = (D2.3);
    D2-.2 = (D2.2);
```

```
D2-.1 = (D2.1);
D2-.0 = (D2.0);
S1-.2 = (S1.2);
S1-.1 = (S1.1);
S1-.0 = (S1.0);
D1-.7 = (D1.7);
D1-.6 = (D1.6);
D1-.5 = (D1.5);
D1-.4 = (D1.4);
D1-.3 = (D1.3);
D1-.2 = (D1.2);
D1-.1 = (D1.1);
D1-.0 = (D1.0);
S3-.2 = (S3.2);
S3-.1 = (S3.1);
S3-.0 = (S3.0);
D3-.7 = (D3.7);
D3-.6 = (D3.6);
D3-.5 = (D3.5);
D3-.4 = (D3.4);
D3-.3 = (D3.3);
D3-.2 = (D3.2);
D3-.1 = (D3.1);
D3-.0 = (D3.0);
S4-.2 = (S4.2);
S4-.1 = (S4.1);
S4-.0 = (S4.0);
D4-.7 = (D4.7);
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
U9.D7- = (NC/0/);
S0-.2 = (S0.2);
S0-.1 = (S0.1);
S0-.0 = (S0.0);
D0-.7 = (D0.7);
D0-.6 = (D0.6);
D0-.5 = (D0.5);
D0-.4 = (D0.4);
D0-.3 = (D0.3);
D0-.2 = (D0.2);
D0-.1 = (D0.1);
D0-.0 = (D0.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
CP- = (CP);
WAIT- = (WAIT);
STB_I- = (STB_I);
BWAIT- = (BWAIT);
BWAIT- = (BWAIT);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);

/* part instances ***************************/

  U2(U2.Z-=Z) = N1A(RESET_-=A);
  U1(U1.Z-=Z) = N1B(U2.Z-=A);
```

```
U4.7(U4.Q-.7=Q) = FD2SA(U4.Q-.7=TI,RC4-.7=D,CP-=CP,BWAIT-=TE,
        U1.Z-=CD);
U4.6(U4.Q-.6=Q) = FD2SA(U4.Q-.6=TI,RC4-.6=D,CP-=CP,BWAIT-=TE,
        U1.Z-=CD);
U4.5(U4.Q-.5=Q) = FD2SA(U4.Q-.5=TI,RC4-.5=D,CP-=CP,BWAIT-=TE,
        U1.Z-=CD);
U4.4(U4.Q-.4=Q) = FD2SA(U4.Q-.4=TI,RC4-.4=D,CP-=CP,BWAIT-=TE,
        U1.Z-=CD);
U4.3(U4.Q-.3=Q) = FD2SA(U4.Q-.3=TI,RC4-.3=D,CP-=CP,BWAIT-=TE,
        U1.Z-=CD);
U4.2(U4.Q-.2=Q) = FD2SA(U4.Q-.2=TI,RC4-.2=D,CP-=CP,BWAIT-=TE,
        U1.Z-=CD);
U4.1(U4.Q-.1=Q) = FD2SA(U4.Q-.1=TI,RC4-.1=D,CP-=CP,BWAIT-=TE,
        U1.Z-=CD);
U4.0(U4.Q-.0=Q) = FD2SA(U4.Q-.0=TI,RC4-.0=D,CP-=CP,BWAIT-=TE,
        U1.Z-=CD);
U9.7(D2-.7=Z) = MUX81HB(U13.Q-.7=D0,U12.Q-.7=D1,U8.Q-.7=D2,
        U7.Q-.7=D3,U4.Q-.7=D4,U9.B-=B,U9.A-=A,U9.D7-=D5,
        U9.D7-=D6,U9.D7-=D7,U9.C-=C);
U9.6(D2-.6=Z) = MUX81HB(U13.Q-.6=D0,U12.Q-.6=D1,U8.Q-.6=D2,
        U7.Q-.6=D3,U4.Q-.6=D4,U9.B-=B,U9.A-=A,U9.D7-=D5,
        U9.D7-=D6,U9.D7-=D7,U9.C-=C);
U9.5(D2-.5=Z) = MUX81HB(U13.Q-.5=D0,U12.Q-.5=D1,U8.Q-.5=D2,
        U7.Q-.5=D3,U4.Q-.5=D4,U9.B-=B,U9.A-=A,U9.D7-=D5,
        U9.D7-=D6,U9.D7-=D7,U9.C-=C);
U9.4(D2-.4=Z) = MUX81HB(U13.Q-.4=D0,U12.Q-.4=D1,U8.Q-.4=D2,
        U7.Q-.4=D3,U4.Q-.4=D4,U9.B-=B,U9.A-=A,U9.D7-=D5,
        U9.D7-=D6,U9.D7-=D7,U9.C-=C);
U9.3(D2-.3=Z) = MUX81HB(U13.Q-.3=D0,U12.Q-.3=D1,U8.Q-.3=D2,
        U7.Q-.3=D3,U4.Q-.3=D4,U9.B-=B,U9.A-=A,U9.D7-=D5,
        U9.D7-=D6,U9.D7-=D7,U9.C-=C);
U9.2(D2-.2=Z) = MUX81HB(U13.Q-.2=D0,U12.Q-.2=D1,U8.Q-.2=D2,
        U7.Q-.2=D3,U4.Q-.2=D4,U9.B-=B,U9.A-=A,U9.D7-=D5,
        U9.D7-=D6,U9.D7-=D7,U9.C-=C);
U9.1(D2-.1=Z) = MUX81HB(U13.Q-.1=D0,U12.Q-.1=D1,U8.Q-.1=D2,
        U7.Q-.1=D3,U4.Q-.1=D4,U9.B-=B,U9.A-=A,U9.D7-=D5,
        U9.D7-=D6,U9.D7-=D7,U9.C-=C);
U9.0(D2-.0=Z) = MUX81HB(U13.Q-.0=D0,U12.Q-.0=D1,U8.Q-.0=D2,
        U7.Q-.0=D3,U4.Q-.0=D4,U9.B-=B,U9.A-=A,U9.D7-=D5,
        U9.D7-=D6,U9.D7-=D7,U9.C-=C);
U10.7(D1-.7=Z) = MUX81HB(U13.Q-.7=D0,U12.Q-.7=D1,U8.Q-.7=D2,
        U7.Q-.7=D3,U4.Q-.7=D4,U9.D7-=D5,U9.D7-=D6,U9.D7-=D7,
        U10.C-=C,U10.B-=B,U10.A-=A);
U10.6(D1-.6=Z) = MUX81HB(U13.Q-.6=D0,U12.Q-.6=D1,U8.Q-.6=D2,
        U7.Q-.6=D3,U4.Q-.6=D4,U9.D7-=D5,U9.D7-=D6,U9.D7-=D7,
        U10.C-=C,U10.B-=B,U10.A-=A);
U10.5(D1-.5=Z) = MUX81HB(U13.Q-.5=D0,U12.Q-.5=D1,U8.Q-.5=D2,
        U7.Q-.5=D3,U4.Q-.5=D4,U9.D7-=D5,U9.D7-=D6,U9.D7-=D7,
        U10.C-=C,U10.B-=B,U10.A-=A);
U10.4(D1-.4=Z) = MUX81HB(U13.Q-.4=D0,U12.Q-.4=D1,U8.Q-.4=D2,
        U7.Q-.4=D3,U4.Q-.4=D4,U9.D7-=D5,U9.D7-=D6,U9.D7-=D7,
        U10.C-=C,U10.B-=B,U10.A-=A);
U10.3(D1-.3=Z) = MUX81HB(U13.Q-.3=D0,U12.Q-.3=D1,U8.Q-.3=D2,
        U7.Q-.3=D3,U4.Q-.3=D4,U9.D7-=D5,U9.D7-=D6,U9.D7-=D7,
        U10.C-=C,U10.B-=B,U10.A-=A);
U10.2(D1-.2=Z) = MUX81HB(U13.Q-.2=D0,U12.Q-.2=D1,U8.Q-.2=D2,
        U7.Q-.2=D3,U4.Q-.2=D4,U9.D7-=D5,U9.D7-=D6,U9.D7-=D7,
        U10.C-=C,U10.B-=B,U10.A-=A);
U10.1(D1-.1=Z) = MUX81HB(U13.Q-.1=D0,U12.Q-.1=D1,U8.Q-.1=D2,
        U7.Q-.1=D3,U4.Q-.1=D4,U9.D7-=D5,U9.D7-=D6,U9.D7-=D7,
        U10.C-=C,U10.B-=B,U10.A-=A);
U10.0(D1-.0=Z) = MUX81HB(U13.Q-.0=D0,U12.Q-.0=D1,U8.Q-.0=D2,
        U7.Q-.0=D3,U4.Q-.0=D4,U9.D7-=D5,U9.D7-=D6,U9.D7-=D7,
        U10.C-=C,U10.B-=B,U10.A-=A);
U6.7(D3-.7=Z) = MUX81HB(U13.Q-.7=D0,U12.Q-.7=D1,U8.Q-.7=D2,
        U7.Q-.7=D3,U4.Q-.7=D4,U6.C-=C,U6.B-=B,U6.A-=A,U9.D7-=D5,
        U9.D7-=D6,U9.D7-=D7);
U6.6(D3-.6=Z) = MUX81HB(U13.Q-.6=D0,U12.Q-.6=D1,U8.Q-.6=D2,
        U7.Q-.6=D3,U4.Q-.6=D4,U6.C-=C,U6.B-=B,U6.A-=A,U9.D7-=D5,
        U9.D7-=D6,U9.D7-=D7);
U6.5(D3-.5=Z) = MUX81HB(U13.Q-.5=D0,U12.Q-.5=D1,U8.Q-.5=D2,
        U7.Q-.5=D3,U4.Q-.5=D4,U6.C-=C,U6.B-=B,U6.A-=A,U9.D7-=D5,
        U9.D7-=D6,U9.D7-=D7);
```

```
U6.4(D3-.4=Z) = MUX81HB(U13.Q-.4=D0,U12.Q-.4=D1,U8.Q-.4=D2,
        U7.Q-.4=D3,U4.Q-.4=D4,U6.C-=C,U6.B-=B,U6.A-=A,U9.D7-=D5,
        U9.D7-=D6,U9.D7-=D7);
U6.3(D3-.3=Z) = MUX81HB(U13.Q-.3=D0,U12.Q-.3=D1,U8.Q-.3=D2,
        U7.Q-.3=D3,U4.Q-.3=D4,U6.C-=C,U6.B-=B,U6.A-=A,U9.D7-=D5,
        U9.D7-=D6,U9.D7-=D7);
U6.2(D3-.2=Z) = MUX81HB(U13.Q-.2=D0,U12.Q-.2=D1,U8.Q-.2=D2,
        U7.Q-.2=D3,U4.Q-.2=D4,U6.C-=C,U6.B-=B,U6.A-=A,U9.D7-=D5,
        U9.D7-=D6,U9.D7-=D7);
U6.1(D3-.1=Z) = MUX81HB(U13.Q-.1=D0,U12.Q-.1=D1,U8.Q-.1=D2,
        U7.Q-.1=D3,U4.Q-.1=D4,U6.C-=C,U6.B-=B,U6.A-=A,U9.D7-=D5,
        U9.D7-=D6,U9.D7-=D7);
U6.0(D3-.0=Z) = MUX81HB(U13.Q-.0=D0,U12.Q-.0=D1,U8.Q-.0=D2,
        U7.Q-.0=D3,U4.Q-.0=D4,U6.C-=C,U6.B-=B,U6.A-=A,U9.D7-=D5,
        U9.D7-=D6,U9.D7-=D7);
U5.7(D4-.7=Z) = MUX81HB(U12.Q-.7=D1,U13.Q-.7=D0,U8.Q-.7=D2,
        U7.Q-.7=D3,U4.Q-.7=D4,U9.D7-=D6,U9.D7-=D7,U9.D7-=D5,
        U5.C-=C,U5.B-=B,U5.A-=A);
U5.6(D4-.6=Z) = MUX81HB(U12.Q-.6=D1,U13.Q-.6=D0,U8.Q-.6=D2,
        U7.Q-.6=D3,U4.Q-.6=D4,U9.D7-=D6,U9.D7-=D7,U9.D7-=D5,
        U5.C-=C,U5.B-=B,U5.A-=A);
U5.5(D4-.5=Z) = MUX81HB(U12.Q-.5=D1,U13.Q-.5=D0,U8.Q-.5=D2,
        U7.Q-.5=D3,U4.Q-.5=D4,U9.D7-=D6,U9.D7-=D7,U9.D7-=D5,
        U5.C-=C,U5.B-=B,U5.A-=A);
U5.4(D4-.4=Z) = MUX81HB(U12.Q-.4=D1,U13.Q-.4=D0,U8.Q-.4=D2,
        U7.Q-.4=D3,U4.Q-.4=D4,U9.D7-=D6,U9.D7-=D7,U9.D7-=D5,
        U5.C-=C,U5.B-=B,U5.A-=A);
U5.3(D4-.3=Z) = MUX81HB(U12.Q-.3=D1,U13.Q-.3=D0,U8.Q-.3=D2,
        U7.Q-.3=D3,U4.Q-.3=D4,U9.D7-=D6,U9.D7-=D7,U9.D7-=D5,
        U5.C-=C,U5.B-=B,U5.A-=A);
U5.2(D4-.2=Z) = MUX81HB(U12.Q-.2=D1,U13.Q-.2=D0,U8.Q-.2=D2,
        U7.Q-.2=D3,U4.Q-.2=D4,U9.D7-=D6,U9.D7-=D7,U9.D7-=D5,
        U5.C-=C,U5.B-=B,U5.A-=A);
U5.1(D4-.1=Z) = MUX81HB(U12.Q-.1=D1,U13.Q-.1=D0,U8.Q-.1=D2,
        U7.Q-.1=D3,U4.Q-.1=D4,U9.D7-=D6,U9.D7-=D7,U9.D7-=D5,
        U5.C-=C,U5.B-=B,U5.A-=A);
U5.0(D4-.0=Z) = MUX81HB(U12.Q-.0=D1,U13.Q-.0=D0,U8.Q-.0=D2,
        U7.Q-.0=D3,U4.Q-.0=D4,U9.D7-=D6,U9.D7-=D7,U9.D7-=D5,
        U5.C-=C,U5.B-=B,U5.A-=A);
U11.7(D0-.7=Z) = MUX81HB(U13.Q-.7=D0,U12.Q-.7=D1,U8.Q-.7=D2,
        U7.Q-.7=D3,U4.Q-.7=D4,U9.D7-=D5,U9.D7-=D6,U9.D7-=D7,
        U11.C-=C,U11.B-=B,U11.A-=A);
U11.6(D0-.6=Z) = MUX81HB(U13.Q-.6=D0,U12.Q-.6=D1,U8.Q-.6=D2,
        U7.Q-.6=D3,U4.Q-.6=D4,U9.D7-=D5,U9.D7-=D6,U9.D7-=D7,
        U11.C-=C,U11.B-=B,U11.A-=A);
U11.5(D0-.5=Z) = MUX81HB(U13.Q-.5=D0,U12.Q-.5=D1,U8.Q-.5=D2,
        U7.Q-.5=D3,U4.Q-.5=D4,U9.D7-=D5,U9.D7-=D6,U9.D7-=D7,
        U11.C-=C,U11.B-=B,U11.A-=A);
U11.4(D0-.4=Z) = MUX81HB(U13.Q-.4=D0,U12.Q-.4=D1,U8.Q-.4=D2,
        U7.Q-.4=D3,U4.Q-.4=D4,U9.D7-=D5,U9.D7-=D6,U9.D7-=D7,
        U11.C-=C,U11.B-=B,U11.A-=A);
U11.3(D0-.3=Z) = MUX81HB(U13.Q-.3=D0,U12.Q-.3=D1,U8.Q-.3=D2,
        U7.Q-.3=D3,U4.Q-.3=D4,U9.D7-=D5,U9.D7-=D6,U9.D7-=D7,
        U11.C-=C,U11.B-=B,U11.A-=A);
U11.2(D0-.2=Z) = MUX81HB(U13.Q-.2=D0,U12.Q-.2=D1,U8.Q-.2=D2,
        U7.Q-.2=D3,U4.Q-.2=D4,U9.D7-=D5,U9.D7-=D6,U9.D7-=D7,
        U11.C-=C,U11.B-=B,U11.A-=A);
U11.1(D0-.1=Z) = MUX81HB(U13.Q-.1=D0,U12.Q-.1=D1,U8.Q-.1=D2,
        U7.Q-.1=D3,U4.Q-.1=D4,U9.D7-=D5,U9.D7-=D6,U9.D7-=D7,
        U11.C-=C,U11.B-=B,U11.A-=A);
U11.0(D0-.0=Z) = MUX81HB(U13.Q-.0=D0,U12.Q-.0=D1,U8.Q-.0=D2,
        U7.Q-.0=D3,U4.Q-.0=D4,U9.D7-=D5,U9.D7-=D6,U9.D7-=D7,
        U11.C-=C,U11.B-=B,U11.A-=A);
U12.7(U12.Q-.7=Q) = FD2SA(U12.Q-.7=TI,RC1-.7=D,CP-=CP,BWAIT-=TE,
        U1.Z-=CD);
U12.6(U12.Q-.6=Q) = FD2SA(U12.Q-.6=TI,RC1-.6=D,CP-=CP,BWAIT-=TE,
        U1.Z-=CD);
U12.5(U12.Q-.5=Q) = FD2SA(U12.Q-.5=TI,RC1-.5=D,CP-=CP,BWAIT-=TE,
        U1.Z-=CD);
U12.4(U12.Q-.4=Q) = FD2SA(U12.Q-.4=TI,RC1-.4=D,CP-=CP,BWAIT-=TE,
        U1.Z-=CD);
U12.3(U12.Q-.3=Q) = FD2SA(U12.Q-.3=TI,RC1-.3=D,CP-=CP,BWAIT-=TE,
        U1.Z-=CD);
```

```
U12.2(U12.Q-.2=Q) = FD2SA(U12.Q-.2=TI,RC1-.2=D,CP-=CP,BWAIT-=TE,
        U1.Z-=CD);
U12.1(U12.Q-.1=Q) = FD2SA(U12.Q-.1=TI,RC1-.1=D,CP-=CP,BWAIT-=TE,
        U1.Z-=CD);
U12.0(U12.Q-.0=Q) = FD2SA(U12.Q-.0=TI,RC1-.0=D,CP-=CP,BWAIT-=TE,
        U1.Z-=CD);
U7.7(U7.Q-.7=Q) = FD2SA(U7.Q-.7=TI,RC3-.7=D,CP-=CP,BWAIT-=TE,
        U1.Z-=CD);
U7.6(U7.Q-.6=Q) = FD2SA(U7.Q-.6=TI,RC3-.6=D,CP-=CP,BWAIT-=TE,
        U1.Z-=CD);
U7.5(U7.Q-.5=Q) = FD2SA(U7.Q-.5=TI,RC3-.5=D,CP-=CP,BWAIT-=TE,
        U1.Z-=CD);
U7.4(U7.Q-.4=Q) = FD2SA(U7.Q-.4=TI,RC3-.4=D,CP-=CP,BWAIT-=TE,
        U1.Z-=CD);
U7.3(U7.Q-.3=Q) = FD2SA(U7.Q-.3=TI,RC3-.3=D,CP-=CP,BWAIT-=TE,
        U1.Z-=CD);
U7.2(U7.Q-.2=Q) = FD2SA(U7.Q-.2=TI,RC3-.2=D,CP-=CP,BWAIT-=TE,
        U1.Z-=CD);
U7.1(U7.Q-.1=Q) = FD2SA(U7.Q-.1=TI,RC3-.1=D,CP-=CP,BWAIT-=TE,
        U1.Z-=CD);
U7.0(U7.Q-.0=Q) = FD2SA(U7.Q-.0=TI,RC3-.0=D,CP-=CP,BWAIT-=TE,
        U1.Z-=CD);
U3(U3.Z-=Z) = NR2B(WAIT-=A,STB_I-=B);
U0(BWAIT-=Z) = N1E(U3.Z-=A);
U8.7(U8.Q-.7=Q) = FD2SA(U8.Q-.7=TI,RC2-.7=D,CP-=CP,BWAIT-=TE,
        U1.Z-=CD);
U8.6(U8.Q-.6=Q) = FD2SA(U8.Q-.6=TI,RC2-.6=D,CP-=CP,BWAIT-=TE,
        U1.Z-=CD);
U8.5(U8.Q-.5=Q) = FD2SA(U8.Q-.5=TI,RC2-.5=D,CP-=CP,BWAIT-=TE,
        U1.Z-=CD);
U8.4(U8.Q-.4=Q) = FD2SA(U8.Q-.4=TI,RC2-.4=D,CP-=CP,BWAIT-=TE,
        U1.Z-=CD);
U8.3(U8.Q-.3=Q) = FD2SA(U8.Q-.3=TI,RC2-.3=D,CP-=CP,BWAIT-=TE,
        U1.Z-=CD);
U8.2(U8.Q-.2=Q) = FD2SA(U8.Q-.2=TI,RC2-.2=D,CP-=CP,BWAIT-=TE,
        U1.Z-=CD);
U8.1(U8.Q-.1=Q) = FD2SA(U8.Q-.1=TI,RC2-.1=D,CP-=CP,BWAIT-=TE,
        U1.Z-=CD);
U8.0(U8.Q-.0=Q) = FD2SA(U8.Q-.0=TI,RC2-.0=D,CP-=CP,BWAIT-=TE,
        U1.Z-=CD);
U13.7(U13.Q-.7=Q) = FD2SA(U13.Q-.7=TI,RC0-.7=D,CP-=CP,BWAIT-=TE,
        U1.Z-=CD);
U13.6(U13.Q-.6=Q) = FD2SA(U13.Q-.6=TI,RC0-.6=D,CP-=CP,BWAIT-=TE,
        U1.Z-=CD);
U13.5(U13.Q-.5=Q) = FD2SA(U13.Q-.5=TI,RC0-.5=D,CP-=CP,BWAIT-=TE,
        U1.Z-=CD);
U13.4(U13.Q-.4=Q) = FD2SA(U13.Q-.4=TI,RC0-.4=D,CP-=CP,BWAIT-=TE,
        U1.Z-=CD);
U13.3(U13.Q-.3=Q) = FD2SA(U13.Q-.3=TI,RC0-.3=D,CP-=CP,BWAIT-=TE,
        U1.Z-=CD);
U13.2(U13.Q-.2=Q) = FD2SA(U13.Q-.2=TI,RC0-.2=D,CP-=CP,BWAIT-=TE,
        U1.Z-=CD);
U13.1(U13.Q-.1=Q) = FD2SA(U13.Q-.1=TI,RC0-.1=D,CP-=CP,BWAIT-=TE,
        U1.Z-=CD);
U13.0(U13.Q-.0=Q) = FD2SA(U13.Q-.0=TI,RC0-.0=D,CP-=CP,BWAIT-=TE,
        U1.Z-=CD);


/* extractors ******************************/

S2-.0 = (U9.A-);
S2-.1 = (U9.B-);
S2-.2 = (U9.C-);
S1-.2 = (U10.C-);
S1-.1 = (U10.B-);
S1-.0 = (U10.A-);
S3-.2 = (U6.C-);
S3-.1 = (U6.B-);
S3-.0 = (U6.A-);
S4-.1 = (U5.B-);
S4-.2 = (U5.C-);
S4-.0 = (U5.A-);
S0-.2 = (U11.C-);
S0-.1 = (U11.B-);
```

```
    S0-.0 = (U11.A-);


  /* type converters *********************/

ANNOTATIONS
{
  BUS BUS_TYPE = "DOT";
}

END MODULE;


/* * * * * * *  Contents of NET file INPMUX_DECV2.NET  * * * * * * * */

/*****************************************************/
/*  Netlist copyright (C) 1989 LSI Logic Corporation  */
/*****************************************************/


MODULE INPMUX_DECV2;

INPUTS      FIRST_ROW,LAST_MINUS1,LAST_ROW,ROW_ORD0,ROW_ORD1,
            ROW_ORD2,SECOND_ROW;
OUTPUTS     S00,S01,S02,S10,S11,S12,S20,S21,S22,S30,S31,S32,S40,
            S41,S42;

LEVEL FUNCTION;
DEFINE

  /* implicit connectors *******************/

    S01- = (S01);
    S10- = (S10);
    S30- = (S30);
    S31- = (S31);
    LAST_MINUS1- = (LAST_MINUS1);
    SECOND_ROW- = (SECOND_ROW);
    LAST_ROW- = (LAST_ROW);
    S20- = (S20);
    S12- = (S12);
    ROW_ORD2- = (ROW_ORD2);
    ROW_ORD1- = (ROW_ORD1);
    ROW_ORD0- = (ROW_ORD0);
    FIRST_ROW- = (FIRST_ROW);
    S32- = (S32);
    S00- = (S00);
    S22- = (S22);
    S02- = (S02);
    S41- = (S41);
    S11- = (S11);
    S40- = (S40);
    S21- = (S21);
    S42- = (S42);


  /* part instances **************************/

    M121(M121.Z-=Z) = ND2B(M73.Z-=A,M93.Z-=B);
    M175(M175.Z-=Z) = ND2B(M69.Z-=A,M73.Z-=B);
    M113(M113.Z-=Z) = AND3B(M21.Z-=B,M17.Z-=A,M25.Z-=C);
    M8(M8.Z-=Z) = N1B(LAST_MINUS1-=A);
    M7(M7.Z-=Z) = N1B(SECOND_ROW-=A);
    M24(M24.Z-=Z) = AND3C(LAST_MINUS1-=B,M7.Z-=A,M9.Z-=C);
    M9(M9.Z-=Z) = N1B(LAST_ROW-=A);
    M16(M16.Z-=Z) = AND3C(SECOND_ROW-=A,M8.Z-=B,M9.Z-=C);
    M136(M136.Z-=Z) = ND2B(M89.Z-=A,M97.Z-=B);
    M161(M161.Z-=Z) = ND2B(M97.Z-=B,M85.Z-=A);
    M85(M85.Z-=Z) = ND3C(M13.Z-=A,M27.Z-=B,M24.Z-=C);
    M141(M141.Z-=Z) = AND2B(M61.Z-=A,M73.Z-=B);
    M145(M145.Z-=Z) = ND2B(M89.Z-=B,M77.Z-=A);
    M77(M77.Z-=Z) = ND3C(M13.Z-=A,M27.Z-=B,M179.Z-=C);
    M143(M143.Z-=Z) = AND3B(M33.Z-=C,M29.Z-=B,M25.Z-=A);
```

```
M110(M110.Z--Z) = AND2B(M33.Z--A,M61.Z--B);
M149(M149.Z--Z) = AND3B(M33.Z--B,M37.Z--C,M17.Z--A);
M151(M151.Z--Z) = ND2B(M77.Z--A,M93.Z--B);
M153(M153.Z--Z) = NR2B(M122.Z--B,M151.Z--A);
M154(S20--Z) = ND3B(M149.Z--A,M150.Z--B,M153.Z--C);
M150(M150.Z--Z) = AND3B(M45.Z--A,M65.Z--C,M53.Z--B);
M53(M53.Z--Z) = ND3C(M26.Z--A,M28.Z--C,M182.Z--B);
M41(M41.Z--Z) = ND3C(M26.Z--A,M27.Z--B,M16.Z--C);
M73(M73.Z--Z) = ND3C(M26.Z--A,M179.Z--C,M182.Z--B);
M65(M65.Z--Z) = ND3C(M26.Z--A,M16.Z--C,M182.Z--B);
M157(S12--Z) = ND3B(M155.Z--A,M156.Z--B,M81.Z--C);
M156(M156.Z--Z) = AND2B(M49.Z--A,M57.Z--B);
M57(M57.Z--Z) = ND3C(M26.Z--A,M24.Z--C,M182.Z--B);
M119(M119.Z--Z) = AND3B(M11.Z--A,M17.Z--B,M25.Z--C);
M105(M105.Z--Z) = ND3C(M4.Z--A,M179.Z--C,M182.Z--B);
M97(M97.Z--Z) = ND3C(M4.Z--A,M28.Z--C,M182.Z--B);
M21(M21.Z--Z) = ND3B(M4.Z--A,M16.Z--C,M182.Z--B);
M25(M25.Z--Z) = ND3C(M4.Z--A,M24.Z--C,M182.Z--B);
M13(M13.Z--Z) = AND2C(M3.Z--B,M12.Z--A);
M12(M12.Z--Z) = N1B(ROW_ORD2--A);
M26(M26.Z--Z) = AND2C(ROW_ORD1--B,M12.Z--A);
M3(M3.Z--Z) = N1B(ROW_ORD1--A);
M4(M4.Z--Z) = AND2C(ROW_ORD2--A,M3.Z--B);
M11(M11.Z--Z) = ND3B(M6.Z--B,M4.Z--A,M179.Z--C);
M27(M27.Z--Z) = AND2C(ROW_ORD0--A,M14.Z--B);
M5(M5.Z--Z) = N1B(ROW_ORD0--A);
M93(M93.Z--Z) = ND3C(M43.Z--B,M13.Z--A,M179.Z--C);
M45(M45.Z--Z) = ND3C(M43.Z--B,M26.Z--A,M179.Z--C);
M43(M43.Z--Z) = AND2B(FIRST_ROW--B,ROW_ORD0--A);
M14(M14.Z--Z) = N1B(FIRST_ROW--A);
M182(M182.Z--Z) = N1D(M15.Z--A);
M15(M15.Z--Z) = ND2C(M5.Z--A,M14.Z--B);
M6(M6.Z--Z) = AND2B(FIRST_ROW--B,M5.Z--A);
M69(M69.Z--Z) = ND3C(M6.Z--B,M26.Z--A,M179.Z--C);
M49(M49.Z--Z) = ND3C(M26.Z--A,M27.Z--B,M179.Z--C);
M173(M173.Z--Z) = AND3B(M45.Z--B,M41.Z--A,M49.Z--C);
M125(M125.Z--Z) = AND2B(M33.Z--A,M45.Z--B);
M126(M126.Z--Z) = AND2B(M61.Z--A,M65.Z--B);
M127(S32--Z) = ND3B(M125.Z--A,M126.Z--B,M77.Z--C);
M180(M180.Z--Z) = AND3B(M49.Z--A,M57.Z--B,M77.Z--C);
M181(M181.Z--Z) = ND2B(M89.Z--B,M81.Z--A);
M183(M183.Z--Z) = NR2B(M115.Z--B,M181.Z--A);
M184(S00--Z) = ND3B(M158.Z--A,M180.Z--B,M183.Z--C);
M158(M158.Z--Z) = AND3B(M33.Z--A,M45.Z--C,M41.Z--B);
M140(M140.Z--Z) = AND2B(M11.Z--A,M41.Z--B);
M142(S22--Z) = ND3B(M141.Z--B,M140.Z--A,M85.Z--C);
M166(M166.Z--Z) = ND2B(M89.Z--B,M85.Z--A);
M111(M111.Z--Z) = AND2B(M69.Z--A,M89.Z--B);
M89(M89.Z--Z) = ND3C(M13.Z--A,M27.Z--B,M16.Z--C);
M17(M17.Z--Z) = ND3C(M13.Z--A,M16.Z--C,M182.Z--B);
M128(M128.Z--Z) = AND3B(M17.Z--A,M29.Z--C,M25.Z--B);
M134(M134.Z--Z) = AND3B(M49.Z--C,M21.Z--A,M25.Z--B);
M155(M155.Z--Z) = AND2B(M11.Z--A,M21.Z--B);
M172(S02--Z) = ND3B(M155.Z--A,M171.Z--B,M105.Z--C);
M171(M171.Z--Z) = AND2B(M37.Z--A,M53.Z--B);
M114(M114.Z--Z) = AND3B(M49.Z--C,M37.Z--B,M29.Z--A);
M118(S41--Z) = ND3B(M113.Z--A,M114.Z--B,M117.Z--C);
M117(M117.Z--Z) = NR2B(M115.Z--A,M116.Z--B);
M116(M116.Z--Z) = ND2B(M105.Z--A,M109.Z--B);
M131(M131.Z--Z) = ND2B(M105.Z--B,M101.Z--A);
M132(M132.Z--Z) = NR2B(M115.Z--A,M131.Z--B);
M133(S31--Z) = ND3B(M128.Z--A,M129.Z--B,M132.Z--C);
M129(M129.Z--Z) = AND3B(M69.Z--B,M89.Z--C,M37.Z--A);
M159(M159.Z--Z) = AND3B(M69.Z--C,M61.Z--A,M65.Z--B);
M163(S11--Z) = ND3B(M158.Z--A,M159.Z--B,M162.Z--C);
M162(M162.Z--Z) = NR2B(M161.Z--B,M160.Z--A);
M160(M160.Z--Z) = ND2B(M73.Z--A,M77.Z--B);
M165(M165.Z--Z) = AND3B(M61.Z--B,M45.Z--A,M73.Z--C);
M61(M61.Z--Z) = ND3C(M13.Z--A,M28.Z--C,M182.Z--B);
M109(M109.Z--Z) = ND3B(M6.Z--B,M13.Z--A,M179.Z--C);
M137(M137.Z--Z) = ND2B(M109.Z--B,M101.Z--A);
M138(M138.Z--Z) = NR2B(M136.Z--A,M137.Z--B);
M139(S30--Z) = ND3B(M134.Z--A,M135.Z--B,M138.Z--C);
M135(M135.Z--Z) = AND3B(M69.Z--C,M57.Z--B,M53.Z--A);
```

```
M120(M120.Z--Z) = AND3B(M41.Z--A,M57.Z--C,M53.Z--B);
M124(S40--Z) = ND3B(M119.Z--A,M120.Z--B,M123.Z--C);
M123(M123.Z--Z) = NR2B(M121.Z--A,M122.Z--B);
M122(M122.Z--Z) = ND2B(M97.Z--A,M105.Z--B);
M115(M115.Z--Z) = ND2B(M93.Z--A,M97.Z--B);
M167(M167.Z--Z) = ND2B(M93.Z--A,M101.Z--B);
M168(M168.Z--Z) = NR2B(M166.Z--A,M167.Z--B);
M169(S10--Z) = ND3B(M164.Z--A,M165.Z--B,M168.Z--C);
M164(M164.Z--Z) = AND3B(M41.Z--C,M29.Z--B,M25.Z--A);
M29(M29.Z--Z) = ND3C(M26.Z--A,M27.Z--B,M28.Z--C);
M37(M37.Z--Z) = ND3C(M26.Z--A,M27.Z--B,M24.Z--C);
M33(M33.Z--Z) = ND3C(M13.Z--A,M24.Z--C,M182.Z--B);
M101(M101.Z--Z) = ND3C(M13.Z--A,M179.Z--C,M182.Z--B);
M179(M179.Z--Z) = N1C(M10.Z--A);
M10(M10.Z--Z) = ND3B(M7.Z--A,M8.Z--B,M9.Z--C);
M28(M28.Z--Z) = AND3C(LAST_ROW--C,M7.Z--A,M8.Z--B);
M81(M81.Z--Z) = ND3B(M13.Z--A,M27.Z--B,M28.Z--C);
M176(M176.Z--Z) = ND2B(M85.Z--B,M81.Z--A);
M177(M177.Z--Z) = NR2B(M175.Z--A,M176.Z--B);
M178(S01--Z) = ND3B(M173.Z--A,M174.Z--B,M177.Z--C);
M174(M174.Z--Z) = AND3B(M61.Z--B,M65.Z--C,M57.Z--A);
M144(M144.Z--Z) = AND3B(M69.Z--C,M45.Z--A,M65.Z--B);
M148(S21--Z) = ND3B(M143.Z--A,M144.Z--B,M147.Z--C);
M147(M147.Z--Z) = NR2B(M145.Z--A,M146.Z--B);
M146(M146.Z--Z) = ND2B(M97.Z--A,M101.Z--B);
M112(S42--Z) = ND3B(M110.Z--A,M111.Z--B,M101.Z--C);


/* extractors ******************************/


/* type converters *********************/

ANNOTATIONS
{
 BUS BUS_TYPE = "DOT";
}

END MODULE;


/* * * * * * *  Contents of NET file INP_MUX.NET  * * * * * * */

/******************************************************/
/*  Netlist copyright (C) 1989 LSI Logic Corporation  */
/******************************************************/


MODULE INP_MUX;

INPUTS      CP,FIRST_ROW,LAST_MINUS1,LAST_ROW,RC0.7,RC0.6,RC0.5,
            RC0.4,RC0.3,RC0.2,RC0.1,RC0.0,RC1.7,RC1.6,RC1.5,RC1.4,
            RC1.3,RC1.2,RC1.1,RC1.0,RC2.7,RC2.6,RC2.5,RC2.4,RC2.3,
            RC2.2,RC2.1,RC2.0,RC3.7,RC3.6,RC3.5,RC3.4,RC3.3,RC3.2,
            RC3.1,RC3.0,RC4.7,RC4.6,RC4.5,RC4.4,RC4.3,RC4.2,RC4.1,
            RC4.0,RESET_,ROW_ORDR.2,ROW_ORDR.1,ROW_ORDR.0,
            SECOND_ROW,STB_I,S_MODE,WAIT;
OUTPUTS     D0.7,D0.6,D0.5,D0.4,D0.3,D0.2,D0.1,D0.0,D1.7,D1.6,
            D1.5,D1.4,D1.3,D1.2,D1.1,D1.0,D2.7,D2.6,D2.5,D2.4,
            D2.3,D2.2,D2.1,D2.0,D3.7,D3.6,D3.5,D3.4,D3.3,D3.2,
            D3.1,D3.0,D4.7,D4.6,D4.5,D4.4,D4.3,D4.2,D4.1,D4.0;

LEVEL FUNCTION;
DEFINE
 /* implicit connectors *******************/

   RC0-.7 = (RC0.7);
   RC0-.6 = (RC0.6);
   RC0-.5 = (RC0.5);
   RC0-.4 = (RC0.4);
   RC0-.3 = (RC0.3);
   RC0-.2 = (RC0.2);
```

```
RC0-.1 = (RC0.1);
RC0-.0 = (RC0.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
STB_I- = (STB_I);
CP- = (CP);
RESET_- = (RESET_);
D4-.7 = (D4.7);
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
D3-.7 = (D3.7);
D3-.6 = (D3.6);
D3-.5 = (D3.5);
D3-.4 = (D3.4);
D3-.3 = (D3.3);
D3-.2 = (D3.2);
D3-.1 = (D3.1);
D3-.0 = (D3.0);
D2-.7 = (D2.7);
D2-.6 = (D2.6);
D2-.5 = (D2.5);
D2-.4 = (D2.4);
D2-.3 = (D2.3);
D2-.2 = (D2.2);
D2-.1 = (D2.1);
D2-.0 = (D2.0);
D1-.7 = (D1.7);
D1-.6 = (D1.6);
D1-.5 = (D1.5);
D1-.4 = (D1.4);
D1-.3 = (D1.3);
D1-.2 = (D1.2);
D1-.1 = (D1.1);
D1-.0 = (D1.0);
D0-.7 = (D0.7);
D0-.6 = (D0.6);
D0-.5 = (D0.5);
D0-.4 = (D0.4);
D0-.3 = (D0.3);
```

```
 D0-.2 = (D0.2);
 D0-.1 = (D0.1);
 D0-.0 = (D0.0);
 S_MODE- = (S_MODE);
 LAST_ROW- = (LAST_ROW);
 FIRST_ROW- = (FIRST_ROW);
 LAST_MINUS1- = (LAST_MINUS1);
 SECOND_ROW- = (SECOND_ROW);
 ROW_ORDR-.2 = (ROW_ORDR.2);
 ROW_ORDR-.1 = (ROW_ORDR.1);
 ROW_ORDR-.0 = (ROW_ORDR.0);
 WAIT- = (WAIT);


/* part instances **************************/

 U2(U2.Z-=Z) = N1A(S_MODE-=A);
 U3.3(U3.Z-.3=Z) = AND2B(U2.Z-=B,U3.A-.3=A);
 U3.2(U3.Z-.2=Z) = AND2B(U2.Z-=B,U3.A-.2=A);
 U3.1(U3.Z-.1=Z) = AND2B(U2.Z-=B,U3.A-.1=A);
 U3.0(U3.Z-.0=Z) = AND2B(U2.Z-=B,U3.A-.0=A);
 U1(U1.S42-=S42,U1.S41-=S41,U1.S40-=S40,U1.S32-=S32,U1.S31-=S31,
        U1.S30-=S30,U1.S22-=S22,U1.S21-=S21,U1.S20-=S20,
        U1.S12-=S12,U1.S11-=S11,U1.S10-=S10,U1.S02-=S02,
        U1.S01-=S01,U1.S00-=S00) = INPMUX_DECV2(U1.FIRST_ROW-=FIRST_ROW,
        U1.SECOND_ROW-=SECOND_ROW,U1.LAST_MINUS1-=LAST_MINUS1,
        U1.LAST_ROW-=LAST_ROW,U1.ROW_ORD2-=ROW_ORD2,
        U1.ROW_ORD1-=ROW_ORD1,U1.ROW_ORD0-=ROW_ORD0);
 U0(D4-.7=D4.7,D4-.6=D4.6,D4-.5=D4.5,D4-.4=D4.4,D4-.3=D4.3,
        D4-.2=D4.2,D4-.1=D4.1,D4-.0=D4.0,D3-.7=D3.7,D3-.6=D3.6,
        D3-.5=D3.5,D3-.4=D3.4,D3-.3=D3.3,D3-.2=D3.2,D3-.1=D3.1,
        D3-.0=D3.0,D2-.7=D2.7,D2-.6=D2.6,D2-.5=D2.5,D2-.4=D2.4,
        D2-.3=D2.3,D2-.2=D2.2,D2-.1=D2.1,D2-.0=D2.0,D1-.7=D1.7,
        D1-.6=D1.6,D1-.5=D1.5,D1-.4=D1.4,D1-.3=D1.3,D1-.2=D1.2,
        D1-.1=D1.1,D1-.0=D1.0,D0-.7=D0.7,D0-.6=D0.6,D0-.5=D0.5,
        D0-.4=D0.4,D0-.3=D0.3,D0-.2=D0.2,D0-.1=D0.1,D0-.0=D0.0)
         = DATA_MUXV2(RC0-.7=RC0.7,RC0-.6=RC0.6,RC0-.5=RC0.5,
        RC0-.4=RC0.4,RC0-.3=RC0.3,RC0-.2=RC0.2,RC0-.1=RC0.1,
        RC0-.0=RC0.0,RC1-.7=RC1.7,RC1-.6=RC1.6,RC1-.5=RC1.5,
        RC1-.4=RC1.4,RC1-.3=RC1.3,RC1-.2=RC1.2,RC1-.1=RC1.1,
        RC1-.0=RC1.0,RC2-.7=RC2.7,RC2-.6=RC2.6,RC2-.5=RC2.5,
        RC2-.4=RC2.4,RC2-.3=RC2.3,RC2-.2=RC2.2,RC2-.1=RC2.1,
        RC2-.0=RC2.0,RC3-.7=RC3.7,RC3-.6=RC3.6,RC3-.5=RC3.5,
        RC3-.4=RC3.4,RC3-.3=RC3.3,RC3-.2=RC3.2,RC3-.1=RC3.1,
        RC3-.0=RC3.0,RC4-.7=RC4.7,RC4-.6=RC4.6,RC4-.5=RC4.5,
        RC4-.4=RC4.4,RC4-.3=RC4.3,RC4-.2=RC4.2,RC4-.1=RC4.1,
        RC4-.0=RC4.0,STB_I-=STB_I,WAIT-=WAIT,CP-=CP,RESET_-=RESET_,
        U0.S4-.2=S4.2,U0.S4-.1=S4.1,U0.S4-.0=S4.0,U0.S3-.2=S3.2,
        U0.S3-.1=S3.1,U0.S3-.0=S3.0,U0.S2-.2=S2.2,U0.S2-.1=S2.1,
        U0.S2-.0=S2.0,U0.S1-.2=S1.2,U0.S1-.1=S1.1,U0.S1-.0=S1.0,
        U0.S0-.2=S0.2,U0.S0-.1=S0.1,U0.S0-.0=S0.0);


/* extractors ******************************/

 U3.Z-.2 = (U1.LAST_MINUS1-);
 U3.A-.3 = (LAST_ROW-);
 U3.A-.0 = (FIRST_ROW-);
 U3.A-.2 = (LAST_MINUS1-);
 U3.A-.1 = (SECOND_ROW-);
 U3.Z-.1 = (U1.SECOND_ROW-);
 U3.Z-.0 = (U1.FIRST_ROW-);
 U3.Z-.3 = (U1.LAST_ROW-);
 U0.S4-.2 = (U1.S42-);
 U0.S4-.1 = (U1.S41-);
 U0.S4-.0 = (U1.S40-);
 U0.S3-.1 = (U1.S31-);
 U0.S3-.2 = (U1.S32-);
 U0.S3-.0 = (U1.S30-);
 U0.S2-.1 = (U1.S21-);
 U0.S2-.2 = (U1.S22-);
 U0.S2-.0 = (U1.S20-);
 U0.S1-.1 = (U1.S11-);
 U0.S1-.2 = (U1.S12-);
```

```
    U0.S1-.0 = (U1.S10-);
    U0.S0-.1 = (U1.S01-);
    U0.S0-.0 = (U1.S00-);
    ROW_ORDR-.1 = (U1.ROW_ORD1-);
    ROW_ORDR-.2 = (U1.ROW_ORD2-);
    ROW_ORDR-.0 = (U1.ROW_ORD0-);
    U0.S0-.2 = (U1.S02-);


  /* type converters *********************/

ANNOTATIONS
{
  BUS BUS_TYPE = "DOT";
}

END MODULE;


/* * * * * * *  Contents of NET file SRDLY.NET  * * * * * * */

/*******************************************************/
/*  Netlist copyright (C) 1989 LSI Logic Corporation  */
/*******************************************************/


MODULE SRDLY;

INPUTS      CP,D,DLY_POL,NOS.1,NOS.0,RESET_,WAIT;
OUTPUTS     Q0,QD;

LEVEL FUNCTION;
DEFINE
  /* implicit connectors *******************/

    CP- = (CP);
    RESET_- = (RESET_);
    WAIT- = (WAIT);
    Q0- = (Q0);
    D- = (D);
    D- = (D);
    NOS-.1 = (NOS.1);
    NOS-.0 = (NOS.0);
    DLY_POL- = (DLY_POL);
    QD- = (QD);


  /* part instances **************************/

    U2(U2.Z-=Z) = B3A(WAIT-=A);
    U1.18(U1.Q-.18=Q) = FD2SA(U1.D-.18=D,U1.Q-.18=TI,CP-=CP,RESET_-=CD,
            U2.Z-=TE);
    U1.17(U1.Q-.17=Q) = FD2SA(U1.D-.17=D,U1.Q-.17=TI,CP-=CP,RESET_-=CD,
            U2.Z-=TE);
    U1.16(U1.Q-.16=Q) = FD2SA(U1.D-.16=D,U1.Q-.16=TI,CP-=CP,RESET_-=CD,
            U2.Z-=TE);
    U1.15(U1.Q-.15=Q) = FD2SA(U1.D-.15=D,U1.Q-.15=TI,CP-=CP,RESET_-=CD,
            U2.Z-=TE);
    U1.14(U1.Q-.14=Q) = FD2SA(U1.D-.14=D,U1.Q-.14=TI,CP-=CP,RESET_-=CD,
            U2.Z-=TE);
    U1.13(U1.Q-.13=Q) = FD2SA(U1.D-.13=D,U1.Q-.13=TI,CP-=CP,RESET_-=CD,
            U2.Z-=TE);
    U1.12(U1.Q-.12=Q) = FD2SA(U1.D-.12=D,U1.Q-.12=TI,CP-=CP,RESET_-=CD,
            U2.Z-=TE);
    U1.11(U1.Q-.11=Q) = FD2SA(U1.D-.11=D,U1.Q-.11=TI,CP-=CP,RESET_-=CD,
            U2.Z-=TE);
    U1.10(U1.Q-.10=Q) = FD2SA(U1.D-.10=D,U1.Q-.10=TI,CP-=CP,RESET_-=CD,
            U2.Z-=TE);
    U1.9(U1.Q-.9=Q) = FD2SA(U1.D-.9=D,U1.Q-.9=TI,CP-=CP,RESET_-=CD,
            U2.Z-=TE);
    U1.8(U1.Q-.8=Q) = FD2SA(U1.D-.8=D,U1.Q-.8=TI,CP-=CP,RESET_-=CD,
            U2.Z-=TE);
```

```
U1.7(U1.Q-.7=Q) = FD2SA(U1.D-.7=D,U1.Q-.7=TI,CP-=CP,RESET_-=CD,
        U2.Z-=TE);
U1.6(U1.Q-.6=Q) = FD2SA(U1.D-.6=D,U1.Q-.6=TI,CP-=CP,RESET_-=CD,
        U2.Z-=TE);
U1.5(U1.Q-.5=Q) = FD2SA(U1.D-.5=D,U1.Q-.5=TI,CP-=CP,RESET_-=CD,
        U2.Z-=TE);
U1.4(U1.Q-.4=Q) = FD2SA(U1.D-.4=D,U1.Q-.4=TI,CP-=CP,RESET_-=CD,
        U2.Z-=TE);
U1.3(U1.Q-.3=Q) = FD2SA(U1.D-.3=D,U1.Q-.3=TI,CP-=CP,RESET_-=CD,
        U2.Z-=TE);
U1.2(U1.Q-.2=Q) = FD2SA(U1.D-.2=D,U1.Q-.2=TI,CP-=CP,RESET_-=CD,
        U2.Z-=TE);
U1.1(U1.Q-.1=Q) = FD2SA(U1.D-.1=D,U1.Q-.1=TI,CP-=CP,RESET_-=CD,
        U2.Z-=TE);
U1.0(U1.Q-.0=Q) = FD2SA(U1.D-.0=D,U1.Q-.0=TI,CP-=CP,RESET_-=CD,
        U2.Z-=TE);
U0(QD-=Z) = MUX81HB(Q0-=D1,U0.D2-=D2,U0.D3-=D3,U0.D4-=D4,U0.D5-=D5,
        U0.D6-=D6,U0.D7-=D7,D-=D0,U0.B-=B,U0.C-=C,DLY_POL-=A);

/* extractors *****************************/

U1.Q-.9 = (U0.D4-);
U1.Q-.12 = (U0.D5-);
U1.Q-.0 = (Q0-);
U1.Q-.4 = (U0.D2-);
U1.Q-.6 = (U0.D3-);
U1.Q-.14 = (U0.D6-);
U1.Q-.18 = (U0.D7-);
U1.Q-.17 = (M-0.17);
U1.Q-.16 = (M-0.16);
U1.Q-.15 = (M-0.15);
U1.Q-.14 = (M-0.14);
U1.Q-.13 = (M-0.13);
U1.Q-.12 = (M-0.12);
U1.Q-.11 = (M-0.11);
U1.Q-.10 = (M-0.10);
U1.Q-.9 = (M-0.9);
U1.Q-.8 = (M-0.8);
U1.Q-.7 = (M-0.7);
U1.Q-.6 = (M-0.6);
U1.Q-.5 = (M-0.5);
U1.Q-.4 = (M-0.4);
U1.Q-.3 = (M-0.3);
U1.Q-.2 = (M-0.2);
U1.Q-.1 = (M-0.1);
U1.Q-.0 = (M-0.0);
U1.D-.18 = (M-0.17);
U1.D-.17 = (M-0.16);
U1.D-.16 = (M-0.15);
U1.D-.15 = (M-0.14);
U1.D-.14 = (M-0.13);
U1.D-.13 = (M-0.12);
U1.D-.12 = (M-0.11);
U1.D-.11 = (M-0.10);
U1.D-.10 = (M-0.9);
U1.D-.9 = (M-0.8);
U1.D-.8 = (M-0.7);
U1.D-.7 = (M-0.6);
U1.D-.6 = (M-0.5);
U1.D-.5 = (M-0.4);
U1.D-.4 = (M-0.3);
U1.D-.3 = (M-0.2);
U1.D-.2 = (M-0.1);
U1.D-.1 = (M-0.0);
U1.D-.0 = (D-);
NOS-.0 = (U0.B-);
NOS-.1 = (U0.C-);

/* type converters ********************/

ANNOTATIONS
{
```

```
  BUS BUS_TYPE = "DOT";
}

END MODULE;


/* * * * * * *  Contents of NET file DEC24.NET  * * * * * * */

/*******************************************************/
/*  Netlist copyright (C) 1989 LSI Logic Corporation  */
/*******************************************************/


MODULE DEC24;

INPUTS      SEL.1,SEL.0;
OUTPUTS     Z.3,Z.2,Z.1,Z.0;

LEVEL FUNCTION;
DEFINE
  /* implicit connectors ******************/

    Z-.3 = (Z.3);
    Z-.2 = (Z.2);
    Z-.1 = (Z.1);
    Z-.0 = (Z.0);
    SEL-.1 = (SEL.1);
    SEL-.0 = (SEL.0);


  /* part instances *************************/

    U0(U0.Z-=Z) = AND2C(U3.Z2-=A,U4.Z2-=B);
    U4(U4.Z1-=Z1,U4.Z2-=Z2) = B2IA(U4.A-=A);
    U5(U5.Z-=Z) = AND2C(U3.Z1-=A,U4.Z1-=B);
    U2(U2.Z-=Z) = AND2C(U3.Z2-=A,U4.Z1-=B);
    U1(U1.Z-=Z) = AND2C(U4.Z2-=B,U3.Z1-=A);
    U3(U3.Z2-=Z2,U3.Z1-=Z1) = B2IA(U3.A-=A);


  /* extractors ****************************/

    SEL-.1 = (U4.A-);
    Z-.3 = (U0.Z-);
    Z-.0 = (U5.Z-);
    Z-.1 = (U2.Z-);
    Z-.2 = (U1.Z-);
    SEL-.0 = (U3.A-);


  /* type converters ********************/

ANNOTATIONS
{
  BUS BUS_TYPE = "DOT";
}

END MODULE;


/* * * * * * *  Contents of NET file SR5W13V2.NET  * * * * * * */

/*******************************************************/
/*  Netlist copyright (C) 1989 LSI Logic Corporation  */
/*******************************************************/


MODULE SR5W13V2;

INPUTS      ASPR,CP,D.12,D.11,D.10,D.9,D.8,D.7,D.6,D.5,D.4,D.3,
            D.2,D.1,D.0,DUPLICATE,PDI.12,PDI.11,PDI.10,PDI.9,
            PDI.8,PDI.7,PDI.6,PDI.5,PDI.4,PDI.3,PDI.2,PDI.1,PDI.0,
```

```
            PLR_CS_,RESET_,SE,TST,WAIT,WR_;
OUTPUTS     Q0.12,Q0.11,Q0.10,Q0.9,Q0.8,Q0.7,Q0.6,Q0.5,Q0.4,Q0.3,
            Q0.2,Q0.1,Q0.0,Q1.12,Q1.11,Q1.10,Q1.9,Q1.8,Q1.7,Q1.6,
            Q1.5,Q1.4,Q1.3,Q1.2,Q1.1,Q1.0,Q2.12,Q2.11,Q2.10,Q2.9,
            Q2.8,Q2.7,Q2.6,Q2.5,Q2.4,Q2.3,Q2.2,Q2.1,Q2.0,Q3.12,
            Q3.11,Q3.10,Q3.9,Q3.8,Q3.7,Q3.6,Q3.5,Q3.4,Q3.3,Q3.2,
            Q3.1,Q3.0,Q4.12,Q4.11,Q4.10,Q4.9,Q4.8,Q4.7,Q4.6,Q4.5,
            Q4.4,Q4.3,Q4.2,Q4.1,Q4.0;

LEVEL FUNCTION;
DEFINE
  /* implicit connectors ******************/

    Q1-.12 = (Q1.12);
    Q1-.11 = (Q1.11);
    Q1-.10 = (Q1.10);
    Q1-.9 = (Q1.9);
    Q1-.8 = (Q1.8);
    Q1-.7 = (Q1.7);
    Q1-.6 = (Q1.6);
    Q1-.5 = (Q1.5);
    Q1-.4 = (Q1.4);
    Q1-.3 = (Q1.3);
    Q1-.2 = (Q1.2);
    Q1-.1 = (Q1.1);
    Q1-.0 = (Q1.0);
    Q4-.12 = (Q4.12);
    Q4-.11 = (Q4.11);
    Q4-.10 = (Q4.10);
    Q4-.9 = (Q4.9);
    Q4-.8 = (Q4.8);
    Q4-.7 = (Q4.7);
    Q4-.6 = (Q4.6);
    Q4-.5 = (Q4.5);
    Q4-.4 = (Q4.4);
    Q4-.3 = (Q4.3);
    Q4-.2 = (Q4.2);
    Q4-.1 = (Q4.1);
    Q4-.0 = (Q4.0);
    Q3-.12 = (Q3.12);
    Q3-.11 = (Q3.11);
    Q3-.10 = (Q3.10);
    Q3-.9 = (Q3.9);
    Q3-.8 = (Q3.8);
    Q3-.7 = (Q3.7);
    Q3-.6 = (Q3.6);
    Q3-.5 = (Q3.5);
    Q3-.4 = (Q3.4);
    Q3-.3 = (Q3.3);
    Q3-.2 = (Q3.2);
    Q3-.1 = (Q3.1);
    Q3-.0 = (Q3.0);
    RESET_- = (RESET_);
    D-.12 = (D.12);
    D-.11 = (D.11);
    D-.10 = (D.10);
    D-.9 = (D.9);
    D-.8 = (D.8);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    TST- = (TST);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
```

```
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
WR_- = (WR_);
PLR_CS_- = (PLR_CS_);
CP- = (CP);
DUPLICATE- = (DUPLICATE);
ASPR- = (ASPR);
SE- = (SE);
WAIT- = (WAIT);
Q0-.12 = (Q0.12);
Q0-.11 = (Q0.11);
Q0-.10 = (Q0.10);
Q0-.9 = (Q0.9);
Q0-.8 = (Q0.8);
Q0-.7 = (Q0.7);
Q0-.6 = (Q0.6);
Q0-.5 = (Q0.5);
Q0-.4 = (Q0.4);
Q0-.3 = (Q0.3);
Q0-.2 = (Q0.2);
Q0-.1 = (Q0.1);
Q0-.0 = (Q0.0);
Q2-.12 = (Q2.12);
Q2-.11 = (Q2.11);
Q2-.10 = (Q2.10);
Q2-.9 = (Q2.9);
Q2-.8 = (Q2.8);
Q2-.7 = (Q2.7);
Q2-.6 = (Q2.6);
Q2-.5 = (Q2.5);
Q2-.4 = (Q2.4);
Q2-.3 = (Q2.3);
Q2-.2 = (Q2.2);
Q2-.1 = (Q2.1);
Q2-.0 = (Q2.0);


/* part instances ***************************/

U13.12(Q1-.12=Q) = LD1A(U18.Z-=G,U11.Q-.12=D);
U13.11(Q1-.11=Q) = LD1A(U18.Z-=G,U11.Q-.11=D);
U13.10(Q1-.10=Q) = LD1A(U18.Z-=G,U11.Q-.10=D);
U13.9(Q1-.9=Q) = LD1A(U18.Z-=G,U11.Q-.9=D);
U13.8(Q1-.8=Q) = LD1A(U18.Z-=G,U11.Q-.8=D);
U13.7(Q1-.7=Q) = LD1A(U18.Z-=G,U11.Q-.7=D);
U13.6(Q1-.6=Q) = LD1A(U18.Z-=G,U11.Q-.6=D);
U13.5(Q1-.5=Q) = LD1A(U18.Z-=G,U11.Q-.5=D);
U13.4(Q1-.4=Q) = LD1A(U18.Z-=G,U11.Q-.4=D);
U13.3(Q1-.3=Q) = LD1A(U18.Z-=G,U11.Q-.3=D);
U13.2(Q1-.2=Q) = LD1A(U18.Z-=G,U11.Q-.2=D);
U13.1(Q1-.1=Q) = LD1A(U18.Z-=G,U11.Q-.1=D);
U13.0(Q1-.0=Q) = LD1A(U18.Z-=G,U11.Q-.0=D);
U21(U21.Z-=Z) = N1E(U2.Z-=A);
U20(U20.Z-=Z) = N1E(U2.Z-=A);
U3.12(Q4-.12=Q) = LD1A(U20.Z-=G,U7.Q-.12=D);
U3.11(Q4-.11=Q) = LD1A(U20.Z-=G,U7.Q-.11=D);
U3.10(Q4-.10=Q) = LD1A(U20.Z-=G,U7.Q-.10=D);
U3.9(Q4-.9=Q) = LD1A(U20.Z-=G,U7.Q-.9=D);
U3.8(Q4-.8=Q) = LD1A(U20.Z-=G,U7.Q-.8=D);
U3.7(Q4-.7=Q) = LD1A(U20.Z-=G,U7.Q-.7=D);
U3.6(Q4-.6=Q) = LD1A(U20.Z-=G,U7.Q-.6=D);
U3.5(Q4-.5=Q) = LD1A(U20.Z-=G,U7.Q-.5=D);
U3.4(Q4-.4=Q) = LD1A(U20.Z-=G,U7.Q-.4=D);
U3.3(Q4-.3=Q) = LD1A(U20.Z-=G,U7.Q-.3=D);
U3.2(Q4-.2=Q) = LD1A(U20.Z-=G,U7.Q-.2=D);
U3.1(Q4-.1=Q) = LD1A(U20.Z-=G,U7.Q-.1=D);
U3.0(Q4-.0=Q) = LD1A(U20.Z-=G,U7.Q-.0=D);
U19(U19.Z-=Z) = N1E(U2.Z-=A);
U4.12(Q3-.12=Q) = LD1A(U19.Z-=G,U9.Q-.12=D);
U4.11(Q3-.11=Q) = LD1A(U19.Z-=G,U9.Q-.11=D);
```

```
U4.10(Q3-.10=Q) = LD1A(U19.Z-=G,U9.Q-.10=D);
U4.9(Q3-.9=Q) = LD1A(U19.Z-=G,U9.Q-.9=D);
U4.8(Q3-.8=Q) = LD1A(U19.Z-=G,U9.Q-.8=D);
U4.7(Q3-.7=Q) = LD1A(U19.Z-=G,U9.Q-.7=D);
U4.6(Q3-.6=Q) = LD1A(U19.Z-=G,U9.Q-.6=D);
U4.5(Q3-.5=Q) = LD1A(U19.Z-=G,U9.Q-.5=D);
U4.4(Q3-.4=Q) = LD1A(U19.Z-=G,U9.Q-.4=D);
U4.3(Q3-.3=Q) = LD1A(U19.Z-=G,U9.Q-.3=D);
U4.2(Q3-.2=Q) = LD1A(U19.Z-=G,U9.Q-.2=D);
U4.1(Q3-.1=Q) = LD1A(U19.Z-=G,U9.Q-.1=D);
U4.0(Q3-.0=Q) = LD1A(U19.Z-=G,U9.Q-.0=D);
U6(U6.Z-=Z) = B3A(RESET_-=A);
U1.12(U1.Q-.12=Q) = FD2SA(PDI-.12=D,U1.Q-.12=TI,WR_-=CP,PLR_CS_-=TE,
        U6.Z-=CD);
U1.11(U1.Q-.11=Q) = FD2SA(PDI-.11=D,U1.Q-.11=TI,WR_-=CP,PLR_CS_-=TE,
        U6.Z-=CD);
U1.10(U1.Q-.10=Q) = FD2SA(PDI-.10=D,U1.Q-.10=TI,WR_-=CP,PLR_CS_-=TE,
        U6.Z-=CD);
U1.9(U1.Q-.9=Q) = FD2SA(PDI-.9=D,U1.Q-.9=TI,WR_-=CP,PLR_CS_-=TE,
        U6.Z-=CD);
U1.8(U1.Q-.8=Q) = FD2SA(PDI-.8=D,U1.Q-.8=TI,WR_-=CP,PLR_CS_-=TE,
        U6.Z-=CD);
U1.7(U1.Q-.7=Q) = FD2SA(PDI-.7=D,U1.Q-.7=TI,WR_-=CP,PLR_CS_-=TE,
        U6.Z-=CD);
U1.6(U1.Q-.6=Q) = FD2SA(PDI-.6=D,U1.Q-.6=TI,WR_-=CP,PLR_CS_-=TE,
        U6.Z-=CD);
U1.5(U1.Q-.5=Q) = FD2SA(PDI-.5=D,U1.Q-.5=TI,WR_-=CP,PLR_CS_-=TE,
        U6.Z-=CD);
U1.4(U1.Q-.4=Q) = FD2SA(PDI-.4=D,U1.Q-.4=TI,WR_-=CP,PLR_CS_-=TE,
        U6.Z-=CD);
U1.3(U1.Q-.3=Q) = FD2SA(PDI-.3=D,U1.Q-.3=TI,WR_-=CP,PLR_CS_-=TE,
        U6.Z-=CD);
U1.2(U1.Q-.2=Q) = FD2SA(PDI-.2=D,U1.Q-.2=TI,WR_-=CP,PLR_CS_-=TE,
        U6.Z-=CD);
U1.1(U1.Q-.1=Q) = FD2SA(PDI-.1=D,U1.Q-.1=TI,WR_-=CP,PLR_CS_-=TE,
        U6.Z-=CD);
U1.0(U1.Q-.0=Q) = FD2SA(PDI-.0=D,U1.Q-.0=TI,WR_-=CP,PLR_CS_-=TE,
        U6.Z-=CD);
U14.12(U14.Z-.12=Z) = MX21LB(D-.12=A,TST-=S,U1.Q-.12=B);
U14.11(U14.Z-.11=Z) = MX21LB(D-.11=A,TST-=S,U1.Q-.11=B);
U14.10(U14.Z-.10=Z) = MX21LB(D-.10=A,TST-=S,U1.Q-.10=B);
U14.9(U14.Z-.9=Z) = MX21LB(D-.9=A,TST-=S,U1.Q-.9=B);
U14.8(U14.Z-.8=Z) = MX21LB(D-.8=A,TST-=S,U1.Q-.8=B);
U14.7(U14.Z-.7=Z) = MX21LB(D-.7=A,TST-=S,U1.Q-.7=B);
U14.6(U14.Z-.6=Z) = MX21LB(D-.6=A,TST-=S,U1.Q-.6=B);
U14.5(U14.Z-.5=Z) = MX21LB(D-.5=A,TST-=S,U1.Q-.5=B);
U14.4(U14.Z-.4=Z) = MX21LB(D-.4=A,TST-=S,U1.Q-.4=B);
U14.3(U14.Z-.3=Z) = MX21LB(D-.3=A,TST-=S,U1.Q-.3=B);
U14.2(U14.Z-.2=Z) = MX21LB(D-.2=A,TST-=S,U1.Q-.2=B);
U14.1(U14.Z-.1=Z) = MX21LB(D-.1=A,TST-=S,U1.Q-.1=B);
U14.0(U14.Z-.0=Z) = MX21LB(D-.0=A,TST-=S,U1.Q-.0=B);
U0.12(U0.Z-.12=Z) = N1C(U12.Q-.12=A);
U0.11(U0.Z-.11=Z) = N1C(U12.Q-.11=A);
U0.10(U0.Z-.10=Z) = N1C(U12.Q-.10=A);
U0.9(U0.Z-.9=Z) = N1C(U12.Q-.9=A);
U0.8(U0.Z-.8=Z) = N1C(U12.Q-.8=A);
U0.7(U0.Z-.7=Z) = N1C(U12.Q-.7=A);
U0.6(U0.Z-.6=Z) = N1C(U12.Q-.6=A);
U0.5(U0.Z-.5=Z) = N1C(U12.Q-.5=A);
U0.4(U0.Z-.4=Z) = N1C(U12.Q-.4=A);
U0.3(U0.Z-.3=Z) = N1C(U12.Q-.3=A);
U0.2(U0.Z-.2=Z) = N1C(U12.Q-.2=A);
U0.1(U0.Z-.1=Z) = N1C(U12.Q-.1=A);
U0.0(U0.Z-.0=Z) = N1C(U12.Q-.0=A);
U8(U8.Z-=Z) = OR2C(DUPLICATE-=A,U21.Z-=B);
U12.12(U12.Q-.12=Q) = FD2SA(U14.Z-.12=D,CP-=CP,U6.Z-=CD,
        U12.Q-.12=TI,U8.Z-=TE);
U12.11(U12.Q-.11=Q) = FD2SA(U14.Z-.11=D,CP-=CP,U6.Z-=CD,
        U12.Q-.11=TI,U8.Z-=TE);
U12.10(U12.Q-.10=Q) = FD2SA(U14.Z-.10=D,CP-=CP,U6.Z-=CD,
        U12.Q-.10=TI,U8.Z-=TE);
U12.9(U12.Q-.9=Q) = FD2SA(U14.Z-.9=D,CP-=CP,U6.Z-=CD,U12.Q-.9=TI,
        U8.Z-=TE);
```

```
U12.8(U12.Q-.8=Q) = FD2SA(U14.Z-.8=D,CP-=CP,U6.Z-=CD,U12.Q-.8=TI,
        U8.Z-=TE);
U12.7(U12.Q-.7=Q) = FD2SA(U14.Z-.7=D,CP-=CP,U6.Z-=CD,U12.Q-.7=TI,
        U8.Z-=TE);
U12.6(U12.Q-.6=Q) = FD2SA(U14.Z-.6=D,CP-=CP,U6.Z-=CD,U12.Q-.6=TI,
        U8.Z-=TE);
U12.5(U12.Q-.5=Q) = FD2SA(U14.Z-.5=D,CP-=CP,U6.Z-=CD,U12.Q-.5=TI,
        U8.Z-=TE);
U12.4(U12.Q-.4=Q) = FD2SA(U14.Z-.4=D,CP-=CP,U6.Z-=CD,U12.Q-.4=TI,
        U8.Z-=TE);
U12.3(U12.Q-.3=Q) = FD2SA(U14.Z-.3=D,CP-=CP,U6.Z-=CD,U12.Q-.3=TI,
        U8.Z-=TE);
U12.2(U12.Q-.2=Q) = FD2SA(U14.Z-.2=D,CP-=CP,U6.Z-=CD,U12.Q-.2=TI,
        U8.Z-=TE);
U12.1(U12.Q-.1=Q) = FD2SA(U14.Z-.1=D,CP-=CP,U6.Z-=CD,U12.Q-.1=TI,
        U8.Z-=TE);
U12.0(U12.Q-.0=Q) = FD2SA(U14.Z-.0=D,CP-=CP,U6.Z-=CD,U12.Q-.0=TI,
        U8.Z-=TE);
U9.12(U9.Q-.12=Q) = FD2SA(CP-=CP,U6.Z-=CD,U16.Z-=TE,U9.Q-.12=TI,
        U10.Q-.12=D);
U9.11(U9.Q-.11=Q) = FD2SA(CP-=CP,U6.Z-=CD,U16.Z-=TE,U9.Q-.11=TI,
        U10.Q-.11=D);
U9.10(U9.Q-.10=Q) = FD2SA(CP-=CP,U6.Z-=CD,U16.Z-=TE,U9.Q-.10=TI,
        U10.Q-.10=D);
U9.9(U9.Q-.9=Q) = FD2SA(CP-=CP,U6.Z-=CD,U16.Z-=TE,U9.Q-.9=TI,
        U10.Q-.9=D);
U9.8(U9.Q-.8=Q) = FD2SA(CP-=CP,U6.Z-=CD,U16.Z-=TE,U9.Q-.8=TI,
        U10.Q-.8=D);
U9.7(U9.Q-.7=Q) = FD2SA(CP-=CP,U6.Z-=CD,U16.Z-=TE,U9.Q-.7=TI,
        U10.Q-.7=D);
U9.6(U9.Q-.6=Q) = FD2SA(CP-=CP,U6.Z-=CD,U16.Z-=TE,U9.Q-.6=TI,
        U10.Q-.6=D);
U9.5(U9.Q-.5=Q) = FD2SA(CP-=CP,U6.Z-=CD,U16.Z-=TE,U9.Q-.5=TI,
        U10.Q-.5=D);
U9.4(U9.Q-.4=Q) = FD2SA(CP-=CP,U6.Z-=CD,U16.Z-=TE,U9.Q-.4=TI,
        U10.Q-.4=D);
U9.3(U9.Q-.3=Q) = FD2SA(CP-=CP,U6.Z-=CD,U16.Z-=TE,U9.Q-.3=TI,
        U10.Q-.3=D);
U9.2(U9.Q-.2=Q) = FD2SA(CP-=CP,U6.Z-=CD,U16.Z-=TE,U9.Q-.2=TI,
        U10.Q-.2=D);
U9.1(U9.Q-.1=Q) = FD2SA(CP-=CP,U6.Z-=CD,U16.Z-=TE,U9.Q-.1=TI,
        U10.Q-.1=D);
U9.0(U9.Q-.0=Q) = FD2SA(CP-=CP,U6.Z-=CD,U16.Z-=TE,U9.Q-.0=TI,
        U10.Q-.0=D);
U7.12(U7.Q-.12=Q) = FD2SA(CP-=CP,U6.Z-=CD,U16.Z-=TE,U7.Q-.12=TI,
        U9.Q-.12=D);
U7.11(U7.Q-.11=Q) = FD2SA(CP-=CP,U6.Z-=CD,U16.Z-=TE,U7.Q-.11=TI,
        U9.Q-.11=D);
U7.10(U7.Q-.10=Q) = FD2SA(CP-=CP,U6.Z-=CD,U16.Z-=TE,U7.Q-.10=TI,
        U9.Q-.10=D);
U7.9(U7.Q-.9=Q) = FD2SA(CP-=CP,U6.Z-=CD,U16.Z-=TE,U7.Q-.9=TI,
        U9.Q-.9=D);
U7.8(U7.Q-.8=Q) = FD2SA(CP-=CP,U6.Z-=CD,U16.Z-=TE,U7.Q-.8=TI,
        U9.Q-.8=D);
U7.7(U7.Q-.7=Q) = FD2SA(CP-=CP,U6.Z-=CD,U16.Z-=TE,U7.Q-.7=TI,
        U9.Q-.7=D);
U7.6(U7.Q-.6=Q) = FD2SA(CP-=CP,U6.Z-=CD,U16.Z-=TE,U7.Q-.6=TI,
        U9.Q-.6=D);
U7.5(U7.Q-.5=Q) = FD2SA(CP-=CP,U6.Z-=CD,U16.Z-=TE,U7.Q-.5=TI,
        U9.Q-.5=D);
U7.4(U7.Q-.4=Q) = FD2SA(CP-=CP,U6.Z-=CD,U16.Z-=TE,U7.Q-.4=TI,
        U9.Q-.4=D);
U7.3(U7.Q-.3=Q) = FD2SA(CP-=CP,U6.Z-=CD,U16.Z-=TE,U7.Q-.3=TI,
        U9.Q-.3=D);
U7.2(U7.Q-.2=Q) = FD2SA(CP-=CP,U6.Z-=CD,U16.Z-=TE,U7.Q-.2=TI,
        U9.Q-.2=D);
U7.1(U7.Q-.1=Q) = FD2SA(CP-=CP,U6.Z-=CD,U16.Z-=TE,U7.Q-.1=TI,
        U9.Q-.1=D);
U7.0(U7.Q-.0=Q) = FD2SA(CP-=CP,U6.Z-=CD,U16.Z-=TE,U7.Q-.0=TI,
        U9.Q-.0=D);
U16(U16.Z-=Z) = N1E(U2.Z-=A);
U17(U17.Z-=Z) = N1C(WAIT-=A);
U2(U2.Z-=Z) = AND3C(ASPR-=B,SE-=A,U17.Z-=C);
U18(U18.Z-=Z) = N1E(U2.Z-=A);
```

```
U15.12(Q0-.12=Q) = LD1A(U18.Z-=G,U0.Z-.12=D);
U15.11(Q0-.11=Q) = LD1A(U18.Z-=G,U0.Z-.11=D);
U15.10(Q0-.10=Q) = LD1A(U18.Z-=G,U0.Z-.10=D);
U15.9(Q0-.9=Q) = LD1A(U18.Z-=G,U0.Z-.9=D);
U15.8(Q0-.8=Q) = LD1A(U18.Z-=G,U0.Z-.8=D);
U15.7(Q0-.7=Q) = LD1A(U18.Z-=G,U0.Z-.7=D);
U15.6(Q0-.6=Q) = LD1A(U18.Z-=G,U0.Z-.6=D);
U15.5(Q0-.5=Q) = LD1A(U18.Z-=G,U0.Z-.5=D);
U15.4(Q0-.4=Q) = LD1A(U18.Z-=G,U0.Z-.4=D);
U15.3(Q0-.3=Q) = LD1A(U18.Z-=G,U0.Z-.3=D);
U15.2(Q0-.2=Q) = LD1A(U18.Z-=G,U0.Z-.2=D);
U15.1(Q0-.1=Q) = LD1A(U18.Z-=G,U0.Z-.1=D);
U15.0(Q0-.0=Q) = LD1A(U18.Z-=G,U0.Z-.0=D);
U11.12(U11.Q-.12=Q) = FD2SA(CP-=CP,U6.Z-=CD,U11.Q-.12=TI,
        U0.Z-.12=D,U21.Z-=TE);
U11.11(U11.Q-.11=Q) = FD2SA(CP-=CP,U6.Z-=CD,U11.Q-.11=TI,
        U0.Z-.11=D,U21.Z-=TE);
U11.10(U11.Q-.10=Q) = FD2SA(CP-=CP,U6.Z-=CD,U11.Q-.10=TI,
        U0.Z-.10=D,U21.Z-=TE);
U11.9(U11.Q-.9=Q) = FD2SA(CP-=CP,U6.Z-=CD,U11.Q-.9=TI,U0.Z-.9=D,
        U21.Z-=TE);
U11.8(U11.Q-.8=Q) = FD2SA(CP-=CP,U6.Z-=CD,U11.Q-.8=TI,U0.Z-.8=D,
        U21.Z-=TE);
U11.7(U11.Q-.7=Q) = FD2SA(CP-=CP,U6.Z-=CD,U11.Q-.7=TI,U0.Z-.7=D,
        U21.Z-=TE);
U11.6(U11.Q-.6=Q) = FD2SA(CP-=CP,U6.Z-=CD,U11.Q-.6=TI,U0.Z-.6=D,
        U21.Z-=TE);
U11.5(U11.Q-.5=Q) = FD2SA(CP-=CP,U6.Z-=CD,U11.Q-.5=TI,U0.Z-.5=D,
        U21.Z-=TE);
U11.4(U11.Q-.4=Q) = FD2SA(CP-=CP,U6.Z-=CD,U11.Q-.4=TI,U0.Z-.4=D,
        U21.Z-=TE);
U11.3(U11.Q-.3=Q) = FD2SA(CP-=CP,U6.Z-=CD,U11.Q-.3=TI,U0.Z-.3=D,
        U21.Z-=TE);
U11.2(U11.Q-.2=Q) = FD2SA(CP-=CP,U6.Z-=CD,U11.Q-.2=TI,U0.Z-.2=D,
        U21.Z-=TE);
U11.1(U11.Q-.1=Q) = FD2SA(CP-=CP,U6.Z-=CD,U11.Q-.1=TI,U0.Z-.1=D,
        U21.Z-=TE);
U11.0(U11.Q-.0=Q) = FD2SA(CP-=CP,U6.Z-=CD,U11.Q-.0=TI,U0.Z-.0=D,
        U21.Z-=TE);
U10.12(U10.Q-.12=Q) = FD2SA(U11.Q-.12=D,CP-=CP,U6.Z-=CD,U21.Z-=TE,
        U10.Q-.12=TI);
U10.11(U10.Q-.11=Q) = FD2SA(U11.Q-.11=D,CP-=CP,U6.Z-=CD,U21.Z-=TE,
        U10.Q-.11=TI);
U10.10(U10.Q-.10=Q) = FD2SA(U11.Q-.10=D,CP-=CP,U6.Z-=CD,U21.Z-=TE,
        U10.Q-.10=TI);
U10.9(U10.Q-.9=Q) = FD2SA(U11.Q-.9=D,CP-=CP,U6.Z-=CD,U21.Z-=TE,
        U10.Q-.9=TI);
U10.8(U10.Q-.8=Q) = FD2SA(U11.Q-.8=D,CP-=CP,U6.Z-=CD,U21.Z-=TE,
        U10.Q-.8=TI);
U10.7(U10.Q-.7=Q) = FD2SA(U11.Q-.7=D,CP-=CP,U6.Z-=CD,U21.Z-=TE,
        U10.Q-.7=TI);
U10.6(U10.Q-.6=Q) = FD2SA(U11.Q-.6=D,CP-=CP,U6.Z-=CD,U21.Z-=TE,
        U10.Q-.6=TI);
U10.5(U10.Q-.5=Q) = FD2SA(U11.Q-.5=D,CP-=CP,U6.Z-=CD,U21.Z-=TE,
        U10.Q-.5=TI);
U10.4(U10.Q-.4=Q) = FD2SA(U11.Q-.4=D,CP-=CP,U6.Z-=CD,U21.Z-=TE,
        U10.Q-.4=TI);
U10.3(U10.Q-.3=Q) = FD2SA(U11.Q-.3=D,CP-=CP,U6.Z-=CD,U21.Z-=TE,
        U10.Q-.3=TI);
U10.2(U10.Q-.2=Q) = FD2SA(U11.Q-.2=D,CP-=CP,U6.Z-=CD,U21.Z-=TE,
        U10.Q-.2=TI);
U10.1(U10.Q-.1=Q) = FD2SA(U11.Q-.1=D,CP-=CP,U6.Z-=CD,U21.Z-=TE,
        U10.Q-.1=TI);
U10.0(U10.Q-.0=Q) = FD2SA(U11.Q-.0=D,CP-=CP,U6.Z-=CD,U21.Z-=TE,
        U10.Q-.0=TI);
U5.12(Q2-.12=Q) = LD1A(U19.Z-=G,U10.Q-.12=D);
U5.11(Q2-.11=Q) = LD1A(U19.Z-=G,U10.Q-.11=D);
U5.10(Q2-.10=Q) = LD1A(U19.Z-=G,U10.Q-.10=D);
U5.9(Q2-.9=Q) = LD1A(U19.Z-=G,U10.Q-.9=D);
U5.8(Q2-.8=Q) = LD1A(U19.Z-=G,U10.Q-.8=D);
U5.7(Q2-.7=Q) = LD1A(U19.Z-=G,U10.Q-.7=D);
U5.6(Q2-.6=Q) = LD1A(U19.Z-=G,U10.Q-.6=D);
U5.5(Q2-.5=Q) = LD1A(U19.Z-=G,U10.Q-.5=D);
U5.4(Q2-.4=Q) = LD1A(U19.Z-=G,U10.Q-.4=D);
```

```
    U5.3(Q2-.3=Q) = LD1A(U19.Z--G,U10.Q-.3=D);
    U5.2(Q2-.2=Q) = LD1A(U19.Z--G,U10.Q-.2=D);
    U5.1(Q2-.1=Q) = LD1A(U19.Z--G,U10.Q-.1=D);
    U5.0(Q2-.0=Q) = LD1A(U19.Z--G,U10.Q-.0=D);

  /* extractors ******************************/

  /* type converters *********************/

ANNOTATIONS
{
  BUS BUS_TYPE = "DOT";
}

END MODULE;

/* * * * * * *  Contents of NET file PLREGV2.NET  * * * * * * */

/*******************************************************/
/*  Netlist copyright (C) 1989 LSI Logic Corporation  */
/*******************************************************/

MODULE PLREGV2;

INPUTS      CP,D.12,D.11,D.10,D.9,D.8,D.7,D.6,D.5,D.4,D.3,D.2,D.1,
            D.0,DLY_POL,DUP,NOS.1,NOS.0,PDI.12,PDI.11,PDI.10,
            PDI.9,PDI.8,PDI.7,PDI.6,PDI.5,PDI.4,PDI.3,PDI.2,PDI.1,
            PDI.0,PLR_CS_,RESET_,SE,SPR.1,SPR.0,TST,WAIT,WR_;
OUTPUTS     Q0.12,Q0.11,Q0.10,Q0.9,Q0.8,Q0.7,Q0.6,Q0.5,Q0.4,Q0.3,
            Q0.2,Q0.1,Q0.0,Q1.12,Q1.11,Q1.10,Q1.9,Q1.8,Q1.7,Q1.6,
            Q1.5,Q1.4,Q1.3,Q1.2,Q1.1,Q1.0,Q2.12,Q2.11,Q2.10,Q2.9,
            Q2.8,Q2.7,Q2.6,Q2.5,Q2.4,Q2.3,Q2.2,Q2.1,Q2.0,Q3.12,
            Q3.11,Q3.10,Q3.9,Q3.8,Q3.7,Q3.6,Q3.5,Q3.4,Q3.3,Q3.2,
            Q3.1,Q3.0,Q4.12,Q4.11,Q4.10,Q4.9,Q4.8,Q4.7,Q4.6,Q4.5,
            Q4.4,Q4.3,Q4.2,Q4.1,Q4.0;

LEVEL FUNCTION;
DEFINE
  /* implicit connectors *******************/

    DUP- = (DUP);
    SE- = (SE);
    D-.12 = (D.12);
    D-.11 = (D.11);
    D-.10 = (D.10);
    D-.9 = (D.9);
    D-.8 = (D.8);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
```

```
WR_- = (WR_);
PLR_CS_- = (PLR_CS_);
TST- = (TST);
Q2-.12 = (Q2.12);
Q2-.11 = (Q2.11);
Q2-.10 = (Q2.10);
Q2-.9 = (Q2.9);
Q2-.8 = (Q2.8);
Q2-.7 = (Q2.7);
Q2-.6 = (Q2.6);
Q2-.5 = (Q2.5);
Q2-.4 = (Q2.4);
Q2-.3 = (Q2.3);
Q2-.2 = (Q2.2);
Q2-.1 = (Q2.1);
Q2-.0 = (Q2.0);
Q0-.12 = (Q0.12);
Q0-.11 = (Q0.11);
Q0-.10 = (Q0.10);
Q0-.9 = (Q0.9);
Q0-.8 = (Q0.8);
Q0-.7 = (Q0.7);
Q0-.6 = (Q0.6);
Q0-.5 = (Q0.5);
Q0-.4 = (Q0.4);
Q0-.3 = (Q0.3);
Q0-.2 = (Q0.2);
Q0-.1 = (Q0.1);
Q0-.0 = (Q0.0);
Q4-.12 = (Q4.12);
Q4-.11 = (Q4.11);
Q4-.10 = (Q4.10);
Q4-.9 = (Q4.9);
Q4-.8 = (Q4.8);
Q4-.7 = (Q4.7);
Q4-.6 = (Q4.6);
Q4-.5 = (Q4.5);
Q4-.4 = (Q4.4);
Q4-.3 = (Q4.3);
Q4-.2 = (Q4.2);
Q4-.1 = (Q4.1);
Q4-.0 = (Q4.0);
Q3-.12 = (Q3.12);
Q3-.11 = (Q3.11);
Q3-.10 = (Q3.10);
Q3-.9 = (Q3.9);
Q3-.8 = (Q3.8);
Q3-.7 = (Q3.7);
Q3-.6 = (Q3.6);
Q3-.5 = (Q3.5);
Q3-.4 = (Q3.4);
Q3-.3 = (Q3.3);
Q3-.2 = (Q3.2);
Q3-.1 = (Q3.1);
Q3-.0 = (Q3.0);
Q1-.12 = (Q1.12);
Q1-.11 = (Q1.11);
Q1-.10 = (Q1.10);
Q1-.9 = (Q1.9);
Q1-.8 = (Q1.8);
Q1-.7 = (Q1.7);
Q1-.6 = (Q1.6);
Q1-.5 = (Q1.5);
Q1-.4 = (Q1.4);
Q1-.3 = (Q1.3);
Q1-.2 = (Q1.2);
Q1-.1 = (Q1.1);
Q1-.0 = (Q1.0);
SPR-.1 = (SPR.1);
SPR-.0 = (SPR.0);
DSPR-.1 = (DSPR.1);
DSPR-.0 = (DSPR.0);
DSPR-.1 = (DSPR.1);
DSPR-.0 = (DSPR.0);
```

```
DSPR-.1 = (DSPR.1);
DSPR-.0 = (DSPR.0);
NOS-.1 = (NOS.1);
NOS-.0 = (NOS.0);
DLY_POL- = (DLY_POL);
WAIT- = (WAIT);
CP- = (CP);
CP- = (CP);
CP- = (CP);
RESET_- = (RESET_);
RESET_- = (RESET_);
RESET_- = (RESET_);
WAIT- = (WAIT);


/* part instances ***************************/

U0.12(Q4-.12=Z) = MUX41C(U7.Z-=A,U6.Z-=B,U0.D3-.12=D3,U0.D2-.12=D2,
        U0.D1-.12=D1,U0.D0-.12=D0);
U0.11(Q4-.11=Z) = MUX41C(U7.Z-=A,U6.Z-=B,U0.D3-.11=D3,U0.D2-.11=D2,
        U0.D1-.11=D1,U0.D0-.11=D0);
U0.10(Q4-.10=Z) = MUX41C(U7.Z-=A,U6.Z-=B,U0.D3-.10=D3,U0.D2-.10=D2,
        U0.D1-.10=D1,U0.D0-.10=D0);
U0.9(Q4-.9=Z) = MUX41C(U7.Z-=A,U6.Z-=B,U0.D3-.9=D3,U0.D2-.9=D2,
        U0.D1-.9=D1,U0.D0-.9=D0);
U0.8(Q4-.8=Z) = MUX41C(U7.Z-=A,U6.Z-=B,U0.D3-.8=D3,U0.D2-.8=D2,
        U0.D1-.8=D1,U0.D0-.8=D0);
U0.7(Q4-.7=Z) = MUX41C(U7.Z-=A,U6.Z-=B,U0.D3-.7=D3,U0.D2-.7=D2,
        U0.D1-.7=D1,U0.D0-.7=D0);
U0.6(Q4-.6=Z) = MUX41C(U7.Z-=A,U6.Z-=B,U0.D3-.6=D3,U0.D2-.6=D2,
        U0.D1-.6=D1,U0.D0-.6=D0);
U0.5(Q4-.5=Z) = MUX41C(U7.Z-=A,U6.Z-=B,U0.D3-.5=D3,U0.D2-.5=D2,
        U0.D1-.5=D1,U0.D0-.5=D0);
U0.4(Q4-.4=Z) = MUX41C(U7.Z-=A,U6.Z-=B,U0.D3-.4=D3,U0.D2-.4=D2,
        U0.D1-.4=D1,U0.D0-.4=D0);
U0.3(Q4-.3=Z) = MUX41C(U7.Z-=A,U6.Z-=B,U0.D3-.3=D3,U0.D2-.3=D2,
        U0.D1-.3=D1,U0.D0-.3=D0);
U0.2(Q4-.2=Z) = MUX41C(U7.Z-=A,U6.Z-=B,U0.D3-.2=D3,U0.D2-.2=D2,
        U0.D1-.2=D1,U0.D0-.2=D0);
U0.1(Q4-.1=Z) = MUX41C(U7.Z-=A,U6.Z-=B,U0.D3-.1=D3,U0.D2-.1=D2,
        U0.D1-.1=D1,U0.D0-.1=D0);
U0.0(Q4-.0=Z) = MUX41C(U7.Z-=A,U6.Z-=B,U0.D3-.0=D3,U0.D2-.0=D2,
        U0.D1-.0=D1,U0.D0-.0=D0);
U2.12(Q3-.12=Z) = MUX41C(U7.Z-=A,U6.Z-=B,U2.D3-.12=D3,U2.D2-.12=D2,
        U2.D1-.12=D1,U2.D0-.12=D0);
U2.11(Q3-.11=Z) = MUX41C(U7.Z-=A,U6.Z-=B,U2.D3-.11=D3,U2.D2-.11=D2,
        U2.D1-.11=D1,U2.D0-.11=D0);
U2.10(Q3-.10=Z) = MUX41C(U7.Z-=A,U6.Z-=B,U2.D3-.10=D3,U2.D2-.10=D2,
        U2.D1-.10=D1,U2.D0-.10=D0);
U2.9(Q3-.9=Z) = MUX41C(U7.Z-=A,U6.Z-=B,U2.D3-.9=D3,U2.D2-.9=D2,
        U2.D1-.9=D1,U2.D0-.9=D0);
U2.8(Q3-.8=Z) = MUX41C(U7.Z-=A,U6.Z-=B,U2.D3-.8=D3,U2.D2-.8=D2,
        U2.D1-.8=D1,U2.D0-.8=D0);
U2.7(Q3-.7=Z) = MUX41C(U7.Z-=A,U6.Z-=B,U2.D3-.7=D3,U2.D2-.7=D2,
        U2.D1-.7=D1,U2.D0-.7=D0);
U2.6(Q3-.6=Z) = MUX41C(U7.Z-=A,U6.Z-=B,U2.D3-.6=D3,U2.D2-.6=D2,
        U2.D1-.6=D1,U2.D0-.6=D0);
U2.5(Q3-.5=Z) = MUX41C(U7.Z-=A,U6.Z-=B,U2.D3-.5=D3,U2.D2-.5=D2,
        U2.D1-.5=D1,U2.D0-.5=D0);
U2.4(Q3-.4=Z) = MUX41C(U7.Z-=A,U6.Z-=B,U2.D3-.4=D3,U2.D2-.4=D2,
        U2.D1-.4=D1,U2.D0-.4=D0);
U2.3(Q3-.3=Z) = MUX41C(U7.Z-=A,U6.Z-=B,U2.D3-.3=D3,U2.D2-.3=D2,
        U2.D1-.3=D1,U2.D0-.3=D0);
U2.2(Q3-.2=Z) = MUX41C(U7.Z-=A,U6.Z-=B,U2.D3-.2=D3,U2.D2-.2=D2,
        U2.D1-.2=D1,U2.D0-.2=D0);
U2.1(Q3-.1=Z) = MUX41C(U7.Z-=A,U6.Z-=B,U2.D3-.1=D3,U2.D2-.1=D2,
        U2.D1-.1=D1,U2.D0-.1=D0);
U2.0(Q3-.0=Z) = MUX41C(U7.Z-=A,U6.Z-=B,U2.D3-.0=D3,U2.D2-.0=D2,
        U2.D1-.0=D1,U2.D0-.0=D0);
U4.12(Q1-.12=Z) = MUX41C(U7.Z-=A,U6.Z-=B,U4.D3-.12=D3,U4.D2-.12=D2,
        U4.D1-.12=D1,U4.D0-.12=D0);
U4.11(Q1-.11=Z) = MUX41C(U7.Z-=A,U6.Z-=B,U4.D3-.11=D3,U4.D2-.11=D2,
        U4.D1-.11=D1,U4.D0-.11=D0);
U4.10(Q1-.10=Z) = MUX41C(U7.Z-=A,U6.Z-=B,U4.D3-.10=D3,U4.D2-.10=D2,
        U4.D1-.10=D1,U4.D0-.10=D0);
```

```
U4.9(Q1-.9=Z) = MUX41C(U7.Z-=A,U6.Z-=B,U4.D3-.9=D3,U4.D2-.9=D2,
        U4.D1-.9=D1,U4.D0-.9=D0);
U4.8(Q1-.8=Z) = MUX41C(U7.Z-=A,U6.Z-=B,U4.D3-.8=D3,U4.D2-.8=D2,
        U4.D1-.8=D1,U4.D0-.8=D0);
U4.7(Q1-.7=Z) = MUX41C(U7.Z-=A,U6.Z-=B,U4.D3-.7=D3,U4.D2-.7=D2,
        U4.D1-.7=D1,U4.D0-.7=D0);
U4.6(Q1-.6=Z) = MUX41C(U7.Z-=A,U6.Z-=B,U4.D3-.6=D3,U4.D2-.6=D2,
        U4.D1-.6=D1,U4.D0-.6=D0);
U4.5(Q1-.5=Z) = MUX41C(U7.Z-=A,U6.Z-=B,U4.D3-.5=D3,U4.D2-.5=D2,
        U4.D1-.5=D1,U4.D0-.5=D0);
U4.4(Q1-.4=Z) = MUX41C(U7.Z-=A,U6.Z-=B,U4.D3-.4=D3,U4.D2-.4=D2,
        U4.D1-.4=D1,U4.D0-.4=D0);
U4.3(Q1-.3=Z) = MUX41C(U7.Z-=A,U6.Z-=B,U4.D3-.3=D3,U4.D2-.3=D2,
        U4.D1-.3=D1,U4.D0-.3=D0);
U4.2(Q1-.2=Z) = MUX41C(U7.Z-=A,U6.Z-=B,U4.D3-.2=D3,U4.D2-.2=D2,
        U4.D1-.2=D1,U4.D0-.2=D0);
U4.1(Q1-.1=Z) = MUX41C(U7.Z-=A,U6.Z-=B,U4.D3-.1=D3,U4.D2-.1=D2,
        U4.D1-.1=D1,U4.D0-.1=D0);
U4.0(Q1-.0=Z) = MUX41C(U7.Z-=A,U6.Z-=B,U4.D3-.0=D3,U4.D2-.0=D2,
        U4.D1-.0=D1,U4.D0-.0=D0);
U13(U13.Z-.3=Z.3,U13.Z-.2=Z.2,U13.Z-.1=Z.1,U13.Z-.0=Z.0) =
        DEC24(DSPR-.1=SEL.1,DSPR-.0=SEL.0);
U14.1(DSPR-.1=QD) = SRDLY(SPR-.1=D,NOS-.1=NOS.1,NOS-.0=NOS.0,
        DLY_POL-=DLY_POL,WAIT-=WAIT,CP-=CP,RESET_-=RESET_);
U14.0(DSPR-.0=QD) = SRDLY(SPR-.0=D,NOS-.1=NOS.1,NOS-.0=NOS.0,
        DLY_POL-=DLY_POL,WAIT-=WAIT,CP-=CP,RESET_-=RESET_);
U15.1(U15.Q-.1=Q) = FD2A(CP-=CP,DSPR-.1=D,RESET_-=CD);
U15.0(U15.Q-.0=Q) = FD2A(CP-=CP,DSPR-.0=D,RESET_-=CD);
U6(U6.Z-=Z) = B3A(U6.A-=A);
U7(U7.Z-=Z) = B3A(U7.A-=A);
U5.12(Q0-.12=Z) = MUX41C(U7.Z-=A,U6.Z-=B,U5.D3-.12=D3,U5.D2-.12=D2,
        U5.D1-.12=D1,U5.D0-.12=D0);
U5.11(Q0-.11=Z) = MUX41C(U7.Z-=A,U6.Z-=B,U5.D3-.11=D3,U5.D2-.11=D2,
        U5.D1-.11=D1,U5.D0-.11=D0);
U5.10(Q0-.10=Z) = MUX41C(U7.Z-=A,U6.Z-=B,U5.D3-.10=D3,U5.D2-.10=D2,
        U5.D1-.10=D1,U5.D0-.10=D0);
U5.9(Q0-.9=Z) = MUX41C(U7.Z-=A,U6.Z-=B,U5.D3-.9=D3,U5.D2-.9=D2,
        U5.D1-.9=D1,U5.D0-.9=D0);
U5.8(Q0-.8=Z) = MUX41C(U7.Z-=A,U6.Z-=B,U5.D3-.8=D3,U5.D2-.8=D2,
        U5.D1-.8=D1,U5.D0-.8=D0);
U5.7(Q0-.7=Z) = MUX41C(U7.Z-=A,U6.Z-=B,U5.D3-.7=D3,U5.D2-.7=D2,
        U5.D1-.7=D1,U5.D0-.7=D0);
U5.6(Q0-.6=Z) = MUX41C(U7.Z-=A,U6.Z-=B,U5.D3-.6=D3,U5.D2-.6=D2,
        U5.D1-.6=D1,U5.D0-.6=D0);
U5.5(Q0-.5=Z) = MUX41C(U7.Z-=A,U6.Z-=B,U5.D3-.5=D3,U5.D2-.5=D2,
        U5.D1-.5=D1,U5.D0-.5=D0);
U5.4(Q0-.4=Z) = MUX41C(U7.Z-=A,U6.Z-=B,U5.D3-.4=D3,U5.D2-.4=D2,
        U5.D1-.4=D1,U5.D0-.4=D0);
U5.3(Q0-.3=Z) = MUX41C(U7.Z-=A,U6.Z-=B,U5.D3-.3=D3,U5.D2-.3=D2,
        U5.D1-.3=D1,U5.D0-.3=D0);
U5.2(Q0-.2=Z) = MUX41C(U7.Z-=A,U6.Z-=B,U5.D3-.2=D3,U5.D2-.2=D2,
        U5.D1-.2=D1,U5.D0-.2=D0);
U5.1(Q0-.1=Z) = MUX41C(U7.Z-=A,U6.Z-=B,U5.D3-.1=D3,U5.D2-.1=D2,
        U5.D1-.1=D1,U5.D0-.1=D0);
U5.0(Q0-.0=Z) = MUX41C(U7.Z-=A,U6.Z-=B,U5.D3-.0=D3,U5.D2-.0=D2,
        U5.D1-.0=D1,U5.D0-.0=D0);
U3.12(Q2-.12=Z) = MUX41C(U7.Z-=A,U6.Z-=B,U3.D0-.12=D0,U3.D1-.12=D1,
        U3.D2-.12=D2,U3.D3-.12=D3);
U3.11(Q2-.11=Z) = MUX41C(U7.Z-=A,U6.Z-=B,U3.D0-.11=D0,U3.D1-.11=D1,
        U3.D2-.11=D2,U3.D3-.11=D3);
U3.10(Q2-.10=Z) = MUX41C(U7.Z-=A,U6.Z-=B,U3.D0-.10=D0,U3.D1-.10=D1,
        U3.D2-.10=D2,U3.D3-.10=D3);
U3.9(Q2-.9=Z) = MUX41C(U7.Z-=A,U6.Z-=B,U3.D0-.9=D0,U3.D1-.9=D1,
        U3.D2-.9=D2,U3.D3-.9=D3);
U3.8(Q2-.8=Z) = MUX41C(U7.Z-=A,U6.Z-=B,U3.D0-.8=D0,U3.D1-.8=D1,
        U3.D2-.8=D2,U3.D3-.8=D3);
U3.7(Q2-.7=Z) = MUX41C(U7.Z-=A,U6.Z-=B,U3.D0-.7=D0,U3.D1-.7=D1,
        U3.D2-.7=D2,U3.D3-.7=D3);
U3.6(Q2-.6=Z) = MUX41C(U7.Z-=A,U6.Z-=B,U3.D0-.6=D0,U3.D1-.6=D1,
        U3.D2-.6=D2,U3.D3-.6=D3);
U3.5(Q2-.5=Z) = MUX41C(U7.Z-=A,U6.Z-=B,U3.D0-.5=D0,U3.D1-.5=D1,
        U3.D2-.5=D2,U3.D3-.5=D3);
U3.4(Q2-.4=Z) = MUX41C(U7.Z-=A,U6.Z-=B,U3.D0-.4=D0,U3.D1-.4=D1,
        U3.D2-.4=D2,U3.D3-.4=D3);
```

```
U3.3(Q2-.3=Z) = MUX41C(U7.Z-=A,U6.Z-=B,U3.D0-.3=D0,U3.D1-.3=D1,
        U3.D2-.3=D2,U3.D3-.3=D3);
U3.2(Q2-.2=Z) = MUX41C(U7.Z-=A,U6.Z-=B,U3.D0-.2=D0,U3.D1-.2=D1,
        U3.D2-.2=D2,U3.D3-.2=D3);
U3.1(Q2-.1=Z) = MUX41C(U7.Z-=A,U6.Z-=B,U3.D0-.1=D0,U3.D1-.1=D1,
        U3.D2-.1=D2,U3.D3-.1=D3);
U3.0(Q2-.0=Z) = MUX41C(U7.Z-=A,U6.Z-=B,U3.D0-.0=D0,U3.D1-.0=D1,
        U3.D2-.0=D2,U3.D3-.0=D3);
U1.3(U1.Q0-.3.12=Q0.12,U1.Q0-.3.11=Q0.11,U1.Q0-.3.10=Q0.10,
        U1.Q0-.3.9=Q0.9,U1.Q0-.3.8=Q0.8,U1.Q0-.3.7=Q0.7,
        U1.Q0-.3.6=Q0.6,U1.Q0-.3.5=Q0.5,U1.Q0-.3.4=Q0.4,
        U1.Q0-.3.3=Q0.3,U1.Q0-.3.2=Q0.2,U1.Q0-.3.1=Q0.1,
        U1.Q0-.3.0=Q0.0,U1.Q4-.3.12=Q4.12,U1.Q4-.3.11=Q4.11,
        U1.Q4-.3.10=Q4.10,U1.Q4-.3.9=Q4.9,U1.Q4-.3.8=Q4.8,
        U1.Q4-.3.7=Q4.7,U1.Q4-.3.6=Q4.6,U1.Q4-.3.5=Q4.5,
        U1.Q4-.3.4=Q4.4,U1.Q4-.3.3=Q4.3,U1.Q4-.3.2=Q4.2,
        U1.Q4-.3.1=Q4.1,U1.Q4-.3.0=Q4.0,U1.Q1-.3.12=Q1.12,
        U1.Q1-.3.11=Q1.11,U1.Q1-.3.10=Q1.10,U1.Q1-.3.9=Q1.9,
        U1.Q1-.3.8=Q1.8,U1.Q1-.3.7=Q1.7,U1.Q1-.3.6=Q1.6,
        U1.Q1-.3.5=Q1.5,U1.Q1-.3.4=Q1.4,U1.Q1-.3.3=Q1.3,
        U1.Q1-.3.2=Q1.2,U1.Q1-.3.1=Q1.1,U1.Q1-.3.0=Q1.0,
        U1.Q3-.3.12=Q3.12,U1.Q3-.3.11=Q3.11,U1.Q3-.3.10=Q3.10,
        U1.Q3-.3.9=Q3.9,U1.Q3-.3.8=Q3.8,U1.Q3-.3.7=Q3.7,
        U1.Q3-.3.6=Q3.6,U1.Q3-.3.5=Q3.5,U1.Q3-.3.4=Q3.4,
        U1.Q3-.3.3=Q3.3,U1.Q3-.3.2=Q3.2,U1.Q3-.3.1=Q3.1,
        U1.Q3-.3.0=Q3.0,U1.Q2-.3.12=Q2.12,U1.Q2-.3.11=Q2.11,
        U1.Q2-.3.10=Q2.10,U1.Q2-.3.9=Q2.9,U1.Q2-.3.8=Q2.8,
        U1.Q2-.3.7=Q2.7,U1.Q2-.3.6=Q2.6,U1.Q2-.3.5=Q2.5,
        U1.Q2-.3.4=Q2.4,U1.Q2-.3.3=Q2.3,U1.Q2-.3.2=Q2.2,
        U1.Q2-.3.1=Q2.1,U1.Q2-.3.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.3=ASPR);
U1.2(U1.Q0-.2.12=Q0.12,U1.Q0-.2.11=Q0.11,U1.Q0-.2.10=Q0.10,
        U1.Q0-.2.9=Q0.9,U1.Q0-.2.8=Q0.8,U1.Q0-.2.7=Q0.7,
        U1.Q0-.2.6=Q0.6,U1.Q0-.2.5=Q0.5,U1.Q0-.2.4=Q0.4,
        U1.Q0-.2.3=Q0.3,U1.Q0-.2.2=Q0.2,U1.Q0-.2.1=Q0.1,
        U1.Q0-.2.0=Q0.0,U1.Q4-.2.12=Q4.12,U1.Q4-.2.11=Q4.11,
        U1.Q4-.2.10=Q4.10,U1.Q4-.2.9=Q4.9,U1.Q4-.2.8=Q4.8,
        U1.Q4-.2.7=Q4.7,U1.Q4-.2.6=Q4.6,U1.Q4-.2.5=Q4.5,
        U1.Q4-.2.4=Q4.4,U1.Q4-.2.3=Q4.3,U1.Q4-.2.2=Q4.2,
        U1.Q4-.2.1=Q4.1,U1.Q4-.2.0=Q4.0,U1.Q1-.2.12=Q1.12,
        U1.Q1-.2.11=Q1.11,U1.Q1-.2.10=Q1.10,U1.Q1-.2.9=Q1.9,
        U1.Q1-.2.8=Q1.8,U1.Q1-.2.7=Q1.7,U1.Q1-.2.6=Q1.6,
        U1.Q1-.2.5=Q1.5,U1.Q1-.2.4=Q1.4,U1.Q1-.2.3=Q1.3,
        U1.Q1-.2.2=Q1.2,U1.Q1-.2.1=Q1.1,U1.Q1-.2.0=Q1.0,
        U1.Q3-.2.12=Q3.12,U1.Q3-.2.11=Q3.11,U1.Q3-.2.10=Q3.10,
        U1.Q3-.2.9=Q3.9,U1.Q3-.2.8=Q3.8,U1.Q3-.2.7=Q3.7,
        U1.Q3-.2.6=Q3.6,U1.Q3-.2.5=Q3.5,U1.Q3-.2.4=Q3.4,
        U1.Q3-.2.3=Q3.3,U1.Q3-.2.2=Q3.2,U1.Q3-.2.1=Q3.1,
        U1.Q3-.2.0=Q3.0,U1.Q2-.2.12=Q2.12,U1.Q2-.2.11=Q2.11,
        U1.Q2-.2.10=Q2.10,U1.Q2-.2.9=Q2.9,U1.Q2-.2.8=Q2.8,
        U1.Q2-.2.7=Q2.7,U1.Q2-.2.6=Q2.6,U1.Q2-.2.5=Q2.5,
        U1.Q2-.2.4=Q2.4,U1.Q2-.2.3=Q2.3,U1.Q2-.2.2=Q2.2,
        U1.Q2-.2.1=Q2.1,U1.Q2-.2.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.2=ASPR);
U1.1(U1.Q0-.1.12=Q0.12,U1.Q0-.1.11=Q0.11,U1.Q0-.1.10=Q0.10,
        U1.Q0-.1.9=Q0.9,U1.Q0-.1.8=Q0.8,U1.Q0-.1.7=Q0.7,
        U1.Q0-.1.6=Q0.6,U1.Q0-.1.5=Q0.5,U1.Q0-.1.4=Q0.4,
        U1.Q0-.1.3=Q0.3,U1.Q0-.1.2=Q0.2,U1.Q0-.1.1=Q0.1,
        U1.Q0-.1.0=Q0.0,U1.Q4-.1.12=Q4.12,U1.Q4-.1.11=Q4.11,
        U1.Q4-.1.10=Q4.10,U1.Q4-.1.9=Q4.9,U1.Q4-.1.8=Q4.8,
        U1.Q4-.1.7=Q4.7,U1.Q4-.1.6=Q4.6,U1.Q4-.1.5=Q4.5,
        U1.Q4-.1.4=Q4.4,U1.Q4-.1.3=Q4.3,U1.Q4-.1.2=Q4.2,
```

```
        U1.Q4-.1.1=Q4.1,U1.Q4-.1.0=Q4.0,U1.Q1-.1.12=Q1.12,
        U1.Q1-.1.11=Q1.11,U1.Q1-.1.10=Q1.10,U1.Q1-.1.9=Q1.9,
        U1.Q1-.1.8=Q1.8,U1.Q1-.1.7=Q1.7,U1.Q1-.1.6=Q1.6,
        U1.Q1-.1.5=Q1.5,U1.Q1-.1.4=Q1.4,U1.Q1-.1.3=Q1.3,
        U1.Q1-.1.2=Q1.2,U1.Q1-.1.1=Q1.1,U1.Q1-.1.0=Q1.0,
        U1.Q3-.1.12=Q3.12,U1.Q3-.1.11=Q3.11,U1.Q3-.1.10=Q3.10,
        U1.Q3-.1.9=Q3.9,U1.Q3-.1.8=Q3.8,U1.Q3-.1.7=Q3.7,
        U1.Q3-.1.6=Q3.6,U1.Q3-.1.5=Q3.5,U1.Q3-.1.4=Q3.4,
        U1.Q3-.1.3=Q3.3,U1.Q3-.1.2=Q3.2,U1.Q3-.1.1=Q3.1,
        U1.Q3-.1.0=Q3.0,U1.Q2-.1.12=Q2.12,U1.Q2-.1.11=Q2.11,
        U1.Q2-.1.10=Q2.10,U1.Q2-.1.9=Q2.9,U1.Q2-.1.8=Q2.8,
        U1.Q2-.1.7=Q2.7,U1.Q2-.1.6=Q2.6,U1.Q2-.1.5=Q2.5,
        U1.Q2-.1.4=Q2.4,U1.Q2-.1.3=Q2.3,U1.Q2-.1.2=Q2.2,
        U1.Q2-.1.1=Q2.1,U1.Q2-.1.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.1=ASPR);
U1.0(U1.Q0-.0.12=Q0.12,U1.Q0-.0.11=Q0.11,U1.Q0-.0.10=Q0.10,
        U1.Q0-.0.9=Q0.9,U1.Q0-.0.8=Q0.8,U1.Q0-.0.7=Q0.7,
        U1.Q0-.0.6=Q0.6,U1.Q0-.0.5=Q0.5,U1.Q0-.0.4=Q0.4,
        U1.Q0-.0.3=Q0.3,U1.Q0-.0.2=Q0.2,U1.Q0-.0.1=Q0.1,
        U1.Q0-.0.0=Q0.0,U1.Q4-.0.12=Q4.12,U1.Q4-.0.11=Q4.11,
        U1.Q4-.0.10=Q4.10,U1.Q4-.0.9=Q4.9,U1.Q4-.0.8=Q4.8,
        U1.Q4-.0.7=Q4.7,U1.Q4-.0.6=Q4.6,U1.Q4-.0.5=Q4.5,
        U1.Q4-.0.4=Q4.4,U1.Q4-.0.3=Q4.3,U1.Q4-.0.2=Q4.2,
        U1.Q4-.0.1=Q4.1,U1.Q4-.0.0=Q4.0,U1.Q1-.0.12=Q1.12,
        U1.Q1-.0.11=Q1.11,U1.Q1-.0.10=Q1.10,U1.Q1-.0.9=Q1.9,
        U1.Q1-.0.8=Q1.8,U1.Q1-.0.7=Q1.7,U1.Q1-.0.6=Q1.6,
        U1.Q1-.0.5=Q1.5,U1.Q1-.0.4=Q1.4,U1.Q1-.0.3=Q1.3,
        U1.Q1-.0.2=Q1.2,U1.Q1-.0.1=Q1.1,U1.Q1-.0.0=Q1.0,
        U1.Q3-.0.12=Q3.12,U1.Q3-.0.11=Q3.11,U1.Q3-.0.10=Q3.10,
        U1.Q3-.0.9=Q3.9,U1.Q3-.0.8=Q3.8,U1.Q3-.0.7=Q3.7,
        U1.Q3-.0.6=Q3.6,U1.Q3-.0.5=Q3.5,U1.Q3-.0.4=Q3.4,
        U1.Q3-.0.3=Q3.3,U1.Q3-.0.2=Q3.2,U1.Q3-.0.1=Q3.1,
        U1.Q3-.0.0=Q3.0,U1.Q2-.0.12=Q2.12,U1.Q2-.0.11=Q2.11,
        U1.Q2-.0.10=Q2.10,U1.Q2-.0.9=Q2.9,U1.Q2-.0.8=Q2.8,
        U1.Q2-.0.7=Q2.7,U1.Q2-.0.6=Q2.6,U1.Q2-.0.5=Q2.5,
        U1.Q2-.0.4=Q2.4,U1.Q2-.0.3=Q2.3,U1.Q2-.0.2=Q2.2,
        U1.Q2-.0.1=Q2.1,U1.Q2-.0.0=Q2.0) = SR5W13V2(WAIT-=WAIT,
        DUP-=DUPLICATE,SE-=SE,RESET_-=RESET_,D-.12=D.12,D-.11=D.11,
        D-.10=D.10,D-.9=D.9,D-.8=D.8,D-.7=D.7,D-.6=D.6,D-.5=D.5,
        D-.4=D.4,D-.3=D.3,D-.2=D.2,D-.1=D.1,D-.0=D.0,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        WR_-=WR_,PLR_CS_-=PLR_CS_,TST-=TST,CP-=CP,U13.Z-.0=ASPR);


/* extractors ******************************/

  U1.Q4-.2.12 = (U0.D2-.12);
  U1.Q4-.2.11 = (U0.D2-.11);
  U1.Q4-.2.10 = (U0.D2-.10);
  U1.Q4-.2.9 = (U0.D2-.9);
  U1.Q4-.2.8 = (U0.D2-.8);
  U1.Q4-.2.7 = (U0.D2-.7);
  U1.Q4-.2.6 = (U0.D2-.6);
  U1.Q4-.2.5 = (U0.D2-.5);
  U1.Q4-.2.4 = (U0.D2-.4);
  U1.Q4-.2.3 = (U0.D2-.3);
  U1.Q4-.2.2 = (U0.D2-.2);
  U1.Q4-.2.1 = (U0.D2-.1);
  U1.Q4-.2.0 = (U0.D2-.0);
  U1.Q4-.3.12 = (U0.D3-.12);
  U1.Q4-.3.11 = (U0.D3-.11);
  U1.Q4-.3.10 = (U0.D3-.10);
  U1.Q4-.3.9 = (U0.D3-.9);
  U1.Q4-.3.8 = (U0.D3-.8);
  U1.Q4-.3.7 = (U0.D3-.7);
  U1.Q4-.3.6 = (U0.D3-.6);
```

```
U1.Q4-.3.5 = (U0.D3-.5);
U1.Q4-.3.4 = (U0.D3-.4);
U1.Q4-.3.3 = (U0.D3-.3);
U1.Q4-.3.2 = (U0.D3-.2);
U1.Q4-.3.1 = (U0.D3-.1);
U1.Q4-.3.0 = (U0.D3-.0);
U1.Q4-.1.12 = (U0.D1-.12);
U1.Q4-.1.11 = (U0.D1-.11);
U1.Q4-.1.10 = (U0.D1-.10);
U1.Q4-.1.9 = (U0.D1-.9);
U1.Q4-.1.8 = (U0.D1-.8);
U1.Q4-.1.7 = (U0.D1-.7);
U1.Q4-.1.6 = (U0.D1-.6);
U1.Q4-.1.5 = (U0.D1-.5);
U1.Q4-.1.4 = (U0.D1-.4);
U1.Q4-.1.3 = (U0.D1-.3);
U1.Q4-.1.2 = (U0.D1-.2);
U1.Q4-.1.1 = (U0.D1-.1);
U1.Q4-.1.0 = (U0.D1-.0);
U1.Q4-.0.12 = (U0.D0-.12);
U1.Q4-.0.11 = (U0.D0-.11);
U1.Q4-.0.10 = (U0.D0-.10);
U1.Q4-.0.9 = (U0.D0-.9);
U1.Q4-.0.8 = (U0.D0-.8);
U1.Q4-.0.7 = (U0.D0-.7);
U1.Q4-.0.6 = (U0.D0-.6);
U1.Q4-.0.5 = (U0.D0-.5);
U1.Q4-.0.4 = (U0.D0-.4);
U1.Q4-.0.3 = (U0.D0-.3);
U1.Q4-.0.2 = (U0.D0-.2);
U1.Q4-.0.1 = (U0.D0-.1);
U1.Q4-.0.0 = (U0.D0-.0);
U1.Q3-.2.12 = (U2.D2-.12);
U1.Q3-.2.11 = (U2.D2-.11);
U1.Q3-.2.10 = (U2.D2-.10);
U1.Q3-.2.9 = (U2.D2-.9);
U1.Q3-.2.8 = (U2.D2-.8);
U1.Q3-.2.7 = (U2.D2-.7);
U1.Q3-.2.6 = (U2.D2-.6);
U1.Q3-.2.5 = (U2.D2-.5);
U1.Q3-.2.4 = (U2.D2-.4);
U1.Q3-.2.3 = (U2.D2-.3);
U1.Q3-.2.2 = (U2.D2-.2);
U1.Q3-.2.1 = (U2.D2-.1);
U1.Q3-.2.0 = (U2.D2-.0);
U1.Q3-.1.12 = (U2.D1-.12);
U1.Q3-.1.11 = (U2.D1-.11);
U1.Q3-.1.10 = (U2.D1-.10);
U1.Q3-.1.9 = (U2.D1-.9);
U1.Q3-.1.8 = (U2.D1-.8);
U1.Q3-.1.7 = (U2.D1-.7);
U1.Q3-.1.6 = (U2.D1-.6);
U1.Q3-.1.5 = (U2.D1-.5);
U1.Q3-.1.4 = (U2.D1-.4);
U1.Q3-.1.3 = (U2.D1-.3);
U1.Q3-.1.2 = (U2.D1-.2);
U1.Q3-.1.1 = (U2.D1-.1);
U1.Q3-.1.0 = (U2.D1-.0);
U1.Q3-.3.12 = (U2.D3-.12);
U1.Q3-.3.11 = (U2.D3-.11);
U1.Q3-.3.10 = (U2.D3-.10);
U1.Q3-.3.9 = (U2.D3-.9);
U1.Q3-.3.8 = (U2.D3-.8);
U1.Q3-.3.7 = (U2.D3-.7);
U1.Q3-.3.6 = (U2.D3-.6);
U1.Q3-.3.5 = (U2.D3-.5);
U1.Q3-.3.4 = (U2.D3-.4);
U1.Q3-.3.3 = (U2.D3-.3);
U1.Q3-.3.2 = (U2.D3-.2);
U1.Q3-.3.1 = (U2.D3-.1);
U1.Q3-.3.0 = (U2.D3-.0);
U1.Q3-.0.12 = (U2.D0-.12);
U1.Q3-.0.11 = (U2.D0-.11);
U1.Q3-.0.10 = (U2.D0-.10);
```

```
U1.Q3-.0.9 = (U2.D0-.9);
U1.Q3-.0.8 = (U2.D0-.8);
U1.Q3-.0.7 = (U2.D0-.7);
U1.Q3-.0.6 = (U2.D0-.6);
U1.Q3-.0.5 = (U2.D0-.5);
U1.Q3-.0.4 = (U2.D0-.4);
U1.Q3-.0.3 = (U2.D0-.3);
U1.Q3-.0.2 = (U2.D0-.2);
U1.Q3-.0.1 = (U2.D0-.1);
U1.Q3-.0.0 = (U2.D0-.0);
U1.Q1-.1.12 = (U4.D1-.12);
U1.Q1-.1.11 = (U4.D1-.11);
U1.Q1-.1.10 = (U4.D1-.10);
U1.Q1-.1.9 = (U4.D1-.9);
U1.Q1-.1.8 = (U4.D1-.8);
U1.Q1-.1.7 = (U4.D1-.7);
U1.Q1-.1.6 = (U4.D1-.6);
U1.Q1-.1.5 = (U4.D1-.5);
U1.Q1-.1.4 = (U4.D1-.4);
U1.Q1-.1.3 = (U4.D1-.3);
U1.Q1-.1.2 = (U4.D1-.2);
U1.Q1-.1.1 = (U4.D1-.1);
U1.Q1-.1.0 = (U4.D1-.0);
U1.Q1-.3.12 = (U4.D3-.12);
U1.Q1-.3.11 = (U4.D3-.11);
U1.Q1-.3.10 = (U4.D3-.10);
U1.Q1-.3.9 = (U4.D3-.9);
U1.Q1-.3.8 = (U4.D3-.8);
U1.Q1-.3.7 = (U4.D3-.7);
U1.Q1-.3.6 = (U4.D3-.6);
U1.Q1-.3.5 = (U4.D3-.5);
U1.Q1-.3.4 = (U4.D3-.4);
U1.Q1-.3.3 = (U4.D3-.3);
U1.Q1-.3.2 = (U4.D3-.2);
U1.Q1-.3.1 = (U4.D3-.1);
U1.Q1-.3.0 = (U4.D3-.0);
U1.Q1-.2.12 = (U4.D2-.12);
U1.Q1-.2.11 = (U4.D2-.11);
U1.Q1-.2.10 = (U4.D2-.10);
U1.Q1-.2.9 = (U4.D2-.9);
U1.Q1-.2.8 = (U4.D2-.8);
U1.Q1-.2.7 = (U4.D2-.7);
U1.Q1-.2.6 = (U4.D2-.6);
U1.Q1-.2.5 = (U4.D2-.5);
U1.Q1-.2.4 = (U4.D2-.4);
U1.Q1-.2.3 = (U4.D2-.3);
U1.Q1-.2.2 = (U4.D2-.2);
U1.Q1-.2.1 = (U4.D2-.1);
U1.Q1-.2.0 = (U4.D2-.0);
U1.Q1-.0.12 = (U4.D0-.12);
U1.Q1-.0.11 = (U4.D0-.11);
U1.Q1-.0.10 = (U4.D0-.10);
U1.Q1-.0.9 = (U4.D0-.9);
U1.Q1-.0.8 = (U4.D0-.8);
U1.Q1-.0.7 = (U4.D0-.7);
U1.Q1-.0.6 = (U4.D0-.6);
U1.Q1-.0.5 = (U4.D0-.5);
U1.Q1-.0.4 = (U4.D0-.4);
U1.Q1-.0.3 = (U4.D0-.3);
U1.Q1-.0.2 = (U4.D0-.2);
U1.Q1-.0.1 = (U4.D0-.1);
U1.Q1-.0.0 = (U4.D0-.0);
U15.Q-.1 = (U6.A-);
U15.Q-.0 = (U7.A-);
U1.Q0-.1.12 = (U5.D1-.12);
U1.Q0-.1.11 = (U5.D1-.11);
U1.Q0-.1.10 = (U5.D1-.10);
U1.Q0-.1.9 = (U5.D1-.9);
U1.Q0-.1.8 = (U5.D1-.8);
U1.Q0-.1.7 = (U5.D1-.7);
U1.Q0-.1.6 = (U5.D1-.6);
U1.Q0-.1.5 = (U5.D1-.5);
U1.Q0-.1.4 = (U5.D1-.4);
U1.Q0-.1.3 = (U5.D1-.3);
```

```
U1.Q0-.1.2 = (U5.D1-.2);
U1.Q0-.1.1 = (U5.D1-.1);
U1.Q0-.1.0 = (U5.D1-.0);
U1.Q0-.3.12 = (U5.D3-.12);
U1.Q0-.3.11 = (U5.D3-.11);
U1.Q0-.3.10 = (U5.D3-.10);
U1.Q0-.3.9 = (U5.D3-.9);
U1.Q0-.3.8 = (U5.D3-.8);
U1.Q0-.3.7 = (U5.D3-.7);
U1.Q0-.3.6 = (U5.D3-.6);
U1.Q0-.3.5 = (U5.D3-.5);
U1.Q0-.3.4 = (U5.D3-.4);
U1.Q0-.3.3 = (U5.D3-.3);
U1.Q0-.3.2 = (U5.D3-.2);
U1.Q0-.3.1 = (U5.D3-.1);
U1.Q0-.3.0 = (U5.D3-.0);
U1.Q0-.2.12 = (U5.D2-.12);
U1.Q0-.2.11 = (U5.D2-.11);
U1.Q0-.2.10 = (U5.D2-.10);
U1.Q0-.2.9 = (U5.D2-.9);
U1.Q0-.2.8 = (U5.D2-.8);
U1.Q0-.2.7 = (U5.D2-.7);
U1.Q0-.2.6 = (U5.D2-.6);
U1.Q0-.2.5 = (U5.D2-.5);
U1.Q0-.2.4 = (U5.D2-.4);
U1.Q0-.2.3 = (U5.D2-.3);
U1.Q0-.2.2 = (U5.D2-.2);
U1.Q0-.2.1 = (U5.D2-.1);
U1.Q0-.2.0 = (U5.D2-.0);
U1.Q0-.0.12 = (U5.D0-.12);
U1.Q0-.0.11 = (U5.D0-.11);
U1.Q0-.0.10 = (U5.D0-.10);
U1.Q0-.0.9 = (U5.D0-.9);
U1.Q0-.0.8 = (U5.D0-.8);
U1.Q0-.0.7 = (U5.D0-.7);
U1.Q0-.0.6 = (U5.D0-.6);
U1.Q0-.0.5 = (U5.D0-.5);
U1.Q0-.0.4 = (U5.D0-.4);
U1.Q0-.0.3 = (U5.D0-.3);
U1.Q0-.0.2 = (U5.D0-.2);
U1.Q0-.0.1 = (U5.D0-.1);
U1.Q0-.0.0 = (U5.D0-.0);
U1.Q2-.1.12 = (U3.D1-.12);
U1.Q2-.1.11 = (U3.D1-.11);
U1.Q2-.1.10 = (U3.D1-.10);
U1.Q2-.1.9 = (U3.D1-.9);
U1.Q2-.1.8 = (U3.D1-.8);
U1.Q2-.1.7 = (U3.D1-.7);
U1.Q2-.1.6 = (U3.D1-.6);
U1.Q2-.1.5 = (U3.D1-.5);
U1.Q2-.1.4 = (U3.D1-.4);
U1.Q2-.1.3 = (U3.D1-.3);
U1.Q2-.1.2 = (U3.D1-.2);
U1.Q2-.1.1 = (U3.D1-.1);
U1.Q2-.1.0 = (U3.D1-.0);
U1.Q2-.2.12 = (U3.D2-.12);
U1.Q2-.2.11 = (U3.D2-.11);
U1.Q2-.2.10 = (U3.D2-.10);
U1.Q2-.2.9 = (U3.D2-.9);
U1.Q2-.2.8 = (U3.D2-.8);
U1.Q2-.2.7 = (U3.D2-.7);
U1.Q2-.2.6 = (U3.D2-.6);
U1.Q2-.2.5 = (U3.D2-.5);
U1.Q2-.2.4 = (U3.D2-.4);
U1.Q2-.2.3 = (U3.D2-.3);
U1.Q2-.2.2 = (U3.D2-.2);
U1.Q2-.2.1 = (U3.D2-.1);
U1.Q2-.2.0 = (U3.D2-.0);
U1.Q2-.3.12 = (U3.D3-.12);
U1.Q2-.3.11 = (U3.D3-.11);
U1.Q2-.3.10 = (U3.D3-.10);
U1.Q2-.3.9 = (U3.D3-.9);
U1.Q2-.3.8 = (U3.D3-.8);
U1.Q2-.3.7 = (U3.D3-.7);
```

```
    U1.Q2-.3.6 = (U3.D3-.6);
    U1.Q2-.3.5 = (U3.D3-.5);
    U1.Q2-.3.4 = (U3.D3-.4);
    U1.Q2-.3.3 = (U3.D3-.3);
    U1.Q2-.3.2 = (U3.D3-.2);
    U1.Q2-.3.1 = (U3.D3-.1);
    U1.Q2-.3.0 = (U3.D3-.0);
    U1.Q2-.0.12 = (U3.D0-.12);
    U1.Q2-.0.11 = (U3.D0-.11);
    U1.Q2-.0.10 = (U3.D0-.10);
    U1.Q2-.0.9 = (U3.D0-.9);
    U1.Q2-.0.8 = (U3.D0-.8);
    U1.Q2-.0.7 = (U3.D0-.7);
    U1.Q2-.0.6 = (U3.D0-.6);
    U1.Q2-.0.5 = (U3.D0-.5);
    U1.Q2-.0.4 = (U3.D0-.4);
    U1.Q2-.0.3 = (U3.D0-.3);
    U1.Q2-.0.2 = (U3.D0-.2);
    U1.Q2-.0.1 = (U3.D0-.1);
    U1.Q2-.0.0 = (U3.D0-.0);

  /* type converters *********************/

ANNOTATIONS
{
  BUS BUS_TYPE = "DOT";
}

END MODULE;


/* * * * * * *  Contents of NET file MUX2X1W13X8.NET  * * * * * * */

/******************************************************/
/*  Netlist copyright (C) 1989 LSI Logic Corporation  */
/******************************************************/


MODULE MUX2X1W13X8;

INPUTS      D0.12,D0.11,D0.10,D0.9,D0.8,D0.7,D0.6,D0.5,D0.4,D0.3,
            D0.2,D0.1,D0.0,D1.7,D1.6,D1.5,D1.4,D1.3,D1.2,D1.1,
            D1.0,S;
OUTPUTS     Z.12,Z.11,Z.10,Z.9,Z.8,Z.7,Z.6,Z.5,Z.4,Z.3,Z.2,Z.1,
            Z.0;

LEVEL FUNCTION;
DEFINE
  /* implicit connectors *******************/

    D0-.12 = (D0.12);
    D0-.11 = (D0.11);
    D0-.10 = (D0.10);
    D0-.9 = (D0.9);
    D0-.8 = (D0.8);
    D0-.7 = (D0.7);
    D0-.6 = (D0.6);
    D0-.5 = (D0.5);
    D0-.4 = (D0.4);
    D0-.3 = (D0.3);
    D0-.2 = (D0.2);
    D0-.1 = (D0.1);
    D0-.0 = (D0.0);
    D1-.7 = (D1.7);
    D1-.6 = (D1.6);
    D1-.5 = (D1.5);
    D1-.4 = (D1.4);
    D1-.3 = (D1.3);
    D1-.2 = (D1.2);
    D1-.1 = (D1.1);
    D1-.0 = (D1.0);
    M-0 = (NC/0/);
```

```
    S- = (S);
    Z-.12 = (Z.12);
    Z-.11 = (Z.11);
    Z-.10 = (Z.10);
    Z-.9 = (Z.9);
    Z-.8 = (Z.8);
    Z-.7 = (Z.7);
    Z-.6 = (Z.6);
    Z-.5 = (Z.5);
    Z-.4 = (Z.4);
    Z-.3 = (Z.3);
    Z-.2 = (Z.2);
    Z-.1 = (Z.1);
    Z-.0 = (Z.0);

  /* part instances *************************/

    U3(U3.Z-=Z) = N1B(S-=A);
    U2(U2.Z-=Z) = N1D(U3.Z-=A);
    U1.12(U1.Z-.12=Z) = MX21LB(D0-.12=A,U1.B-.12=B,U2.Z-=S);
    U1.11(U1.Z-.11=Z) = MX21LB(D0-.11=A,U1.B-.11=B,U2.Z-=S);
    U1.10(U1.Z-.10=Z) = MX21LB(D0-.10=A,U1.B-.10=B,U2.Z-=S);
    U1.9(U1.Z-.9=Z) = MX21LB(D0-.9=A,U1.B-.9=B,U2.Z-=S);
    U1.8(U1.Z-.8=Z) = MX21LB(D0-.8=A,U1.B-.8=B,U2.Z-=S);
    U1.7(U1.Z-.7=Z) = MX21LB(D0-.7=A,U1.B-.7=B,U2.Z-=S);
    U1.6(U1.Z-.6=Z) = MX21LB(D0-.6=A,U1.B-.6=B,U2.Z-=S);
    U1.5(U1.Z-.5=Z) = MX21LB(D0-.5=A,U1.B-.5=B,U2.Z-=S);
    U1.4(U1.Z-.4=Z) = MX21LB(D0-.4=A,U1.B-.4=B,U2.Z-=S);
    U1.3(U1.Z-.3=Z) = MX21LB(D0-.3=A,U1.B-.3=B,U2.Z-=S);
    U1.2(U1.Z-.2=Z) = MX21LB(D0-.2=A,U1.B-.2=B,U2.Z-=S);
    U1.1(U1.Z-.1=Z) = MX21LB(D0-.1=A,U1.B-.1=B,U2.Z-=S);
    U1.0(U1.Z-.0=Z) = MX21LB(D0-.0=A,U1.B-.0=B,U2.Z-=S);
    U0.12(Z-.12=Z) = N1C(U1.Z-.12=A);
    U0.11(Z-.11=Z) = N1C(U1.Z-.11=A);
    U0.10(Z-.10=Z) = N1C(U1.Z-.10=A);
    U0.9(Z-.9=Z) = N1C(U1.Z-.9=A);
    U0.8(Z-.8=Z) = N1C(U1.Z-.8=A);
    U0.7(Z-.7=Z) = N1C(U1.Z-.7=A);
    U0.6(Z-.6=Z) = N1C(U1.Z-.6=A);
    U0.5(Z-.5=Z) = N1C(U1.Z-.5=A);
    U0.4(Z-.4=Z) = N1C(U1.Z-.4=A);
    U0.3(Z-.3=Z) = N1C(U1.Z-.3=A);
    U0.2(Z-.2=Z) = N1C(U1.Z-.2=A);
    U0.1(Z-.1=Z) = N1C(U1.Z-.1=A);
    U0.0(Z-.0=Z) = N1C(U1.Z-.0=A);

  /* extractors ******************************/

    U1.B-.12 = (D1-.7);
    U1.B-.11 = (D1-.6);
    U1.B-.10 = (D1-.5);
    U1.B-.9 = (D1-.4);
    U1.B-.8 = (D1-.3);
    U1.B-.7 = (D1-.2);
    U1.B-.6 = (D1-.1);
    U1.B-.5 = (D1-.0);
    U1.B-.0 = (M-0);
    U1.B-.3 = (M-0);
    U1.B-.2 = (M-0);
    U1.B-.1 = (M-0);
    U1.B-.4 = (M-0);

  /* type converters *********************/

ANNOTATIONS
{
  BUS BUS_TYPE = "DOT";
}

END MODULE;
```

```
/* * * * * * *  Contents of NET file AVRGV1.NET  * * * * * * */

/*****************************************************/
/*  Netlist copyright (C) 1989 LSI Logic Corporation  */
/*****************************************************/


MODULE AVRGV1;

INPUTS      CP,DLY_POL,DUP,FRST_ROW,LST_ROW,LST_ROW_1,NOS.1,NOS.0,
            PDI.12,PDI.11,PDI.10,PDI.9,PDI.8,PDI.7,PDI.6,PDI.5,
            PDI.4,PDI.3,PDI.2,PDI.1,PDI.0,PLR_CS_,RC0.7,RC0.6,
            RC0.5,RC0.4,RC0.3,RC0.2,RC0.1,RC0.0,RC1.7,RC1.6,RC1.5,
            RC1.4,RC1.3,RC1.2,RC1.1,RC1.0,RC2.7,RC2.6,RC2.5,RC2.4,
            RC2.3,RC2.2,RC2.1,RC2.0,RC3.7,RC3.6,RC3.5,RC3.4,RC3.3,
            RC3.2,RC3.1,RC3.0,RC4.7,RC4.6,RC4.5,RC4.4,RC4.3,RC4.2,
            RC4.1,RC4.0,RESET_,ROW_ORDR.2,ROW_ORDR.1,ROW_ORDR.0,S,
            SCND_ROW,SE,SEL10,SEL11,SPR.1,SPR.0,STB_I,S_MODE,TST,
            WAIT,WR_;
OUTPUTS     CNVL.12,CNVL.11,CNVL.10,CNVL.9,CNVL.8,CNVL.7,CNVL.6,
            CNVL.5,CNVL.4,CNVL.3,CNVL.2,CNVL.1,CNVL.0,PDO2.15,
            PDO2.14,PDO2.13,PDO2.12,PDO2.11,PDO2.10,PDO2.9,PDO2.8,
            PDO2.7,PDO2.6,PDO2.5,PDO2.4,PDO2.3,PDO2.2,PDO2.1,
            PDO2.0;

LEVEL FUNCTION;
DEFINE
  /* implicit connectors ******************/

    SE- = (SE);
    DUP- = (DUP);
    PLR_CS_- = (PLR_CS_);
    WR_- = (WR_);
    TST- = (TST);
    SPR-.1 = (SPR.1);
    SPR-.0 = (SPR.0);
    CNVL-.12 = (CNVL.12);
    CNVL-.11 = (CNVL.11);
    CNVL-.10 = (CNVL.10);
    CNVL-.9 = (CNVL.9);
    CNVL-.8 = (CNVL.8);
    CNVL-.7 = (CNVL.7);
    CNVL-.6 = (CNVL.6);
    CNVL-.5 = (CNVL.5);
    CNVL-.4 = (CNVL.4);
    CNVL-.3 = (CNVL.3);
    CNVL-.2 = (CNVL.2);
    CNVL-.1 = (CNVL.1);
    CNVL-.0 = (CNVL.0);
    NOS-.1 = (NOS.1);
    NOS-.0 = (NOS.0);
    NOS-.1 = (NOS.1);
    NOS-.0 = (NOS.0);
    DLY_POL- = (DLY_POL);
    DLY_POL- = (DLY_POL);
    BRESET2_- = (BRESET2_);
    BRESET2_- = (BRESET2_);
    CP- = (CP);
    CP- = (CP);
    CP- = (CP);
    CP- = (CP);
    CP- = (CP);
    BWAIT4- = (BWAIT4);
    CP- = (CP);
    BRESET1_- = (BRESET1_);
    M-2 = (NC/0/);
    RESET_- = (RESET_);
    BRESET0_- = (BRESET0_);
    BRESET0_- = (BRESET0_);
    BRESET0_- = (BRESET0_);
    BRESET0_- = (BRESET0_);
    CP- = (CP);
    CP- = (CP);
    BRESET2_- = (BRESET2_);
    CP- = (CP);
```

```
BRESET3_- = (BRESET3_);
BRESET3_- = (BRESET3_);
BRESET3_- = (BRESET3_);
BRESET3_- = (BRESET3_);
CP- = (CP);
BWAIT4- = (BWAIT4);
LST_ROW- = (LST_ROW);
LST_ROW_1- = (LST_ROW_1);
SCND_ROW- = (SCND_ROW);
FRST_ROW- = (FRST_ROW);
ROW_ORDR-.2 = (ROW_ORDR.2);
ROW_ORDR-.1 = (ROW_ORDR.1);
ROW_ORDR-.0 = (ROW_ORDR.0);
STB_I- = (STB_I);
BS- = (BS);
BRESET1_- = (BRESET1_);
WAIT- = (WAIT);
BWAIT4- = (BWAIT4);
BWAIT0- = (BWAIT0);
BWAIT3- = (BWAIT3);
BWAIT2- = (BWAIT2);
BWAIT2- = (BWAIT2);
BWAIT2- = (BWAIT2);
BWAIT1- = (BWAIT1);
BWAIT1- = (BWAIT1);
BWAIT1- = (BWAIT1);
CP- = (CP);
BS- = (BS);
BS- = (BS);
BS- = (BS);
S- = (S);
BS- = (BS);
BS- = (BS);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
S_MODE- = (S_MODE);
```

```
BWAIT3- = (BWAIT3);
BWAIT3- = (BWAIT3);
SEL11- = (SEL11);
SEL10- = (SEL10);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
M-0 = (NC/0/);
M-1 = (NC/0/);
BWAIT4- = (BWAIT4);
BWAIT4- = (BWAIT4);
CP- = (CP);
CP- = (CP);
BWAIT0- = (BWAIT0);
BWAIT0- = (BWAIT0);
BWAIT0- = (BWAIT0);
BRESET1_- = (BRESET1_);
BRESET1_- = (BRESET1_);
BRESET2_- = (BRESET2_);
BRESET2_- = (BRESET2_);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);


/* part instances ***************************/

U25(U25.S-.14=S.14,U25.S-.13=S.13,U25.S-.12=S.12,U25.S-.11=S.11,
        U25.S-.10=S.10,U25.S-.9=S.9,U25.S-.8=S.8,U25.S-.7=S.7,
        U25.S-.6=S.6,U25.S-.5=S.5,U25.S-.4=S.4,U25.S-.3=S.3,
        U25.S-.2=S.2,U25.S-.1=S.1,U25.S-.0=S.0) = ADD14F(
        U27.Q-.13=B.13,U27.Q-.12=B.12,U27.Q-.11=B.11,
        U27.Q-.10=B.10,U27.Q-.9=B.9,U27.Q-.8=B.8,U27.Q-.7=B.7,
        U27.Q-.6=B.6,U27.Q-.5=B.5,U27.Q-.4=B.4,U27.Q-.3=B.3,
        U27.Q-.2=B.2,U27.Q-.1=B.1,U27.Q-.0=B.0,U10.Q-.13=A.13,
        U10.Q-.12=A.12,U10.Q-.11=A.11,U10.Q-.10=A.10,U10.Q-.9=A.9,
        U10.Q-.8=A.8,U10.Q-.7=A.7,U10.Q-.6=A.6,U10.Q-.5=A.5,
        U10.Q-.4=A.4,U10.Q-.3=A.3,U10.Q-.2=A.2,U10.Q-.1=A.1,
        U10.Q-.0=A.0);
U34(BRESET0_-=Z) = B3A(RESET_-=A);
U35(BRESET1_-=Z) = B3A(BRESET0_-=A);
U37(BRESET3_-=Z) = B3A(BRESET2_-=A);
U20.4(U20.Z-.4=Z) = B3A(WAIT-=A);
U20.3(U20.Z-.3=Z) = B3A(WAIT-=A);
U20.2(U20.Z-.2=Z) = B3A(WAIT-=A);
U20.1(U20.Z-.1=Z) = B3A(WAIT-=A);
U20.0(U20.Z-.0=Z) = B3A(WAIT-=A);
U13.12(U13.Q-.12=Q) = FD2SA(BRESET1_-=CD,BWAIT1-=TE,CP-=CP,
        U12.Z-.12=D,U13.Q-.12=TI);
U13.11(U13.Q-.11=Q) = FD2SA(BRESET1_-=CD,BWAIT1-=TE,CP-=CP,
        U12.Z-.11=D,U13.Q-.11=TI);
```

```
U13.10(U13.Q-.10=Q) = FD2SA(BRESET1_-=CD,BWAIT1-=TE,CP-=CP,
        U12.Z-.10=D,U13.Q-.10=TI);
U13.9(U13.Q-.9=Q) = FD2SA(BRESET1_-=CD,BWAIT1-=TE,CP-=CP,
        U12.Z-.9=D,U13.Q-.9=TI);
U13.8(U13.Q-.8=Q) = FD2SA(BRESET1_-=CD,BWAIT1-=TE,CP-=CP,
        U12.Z-.8=D,U13.Q-.8=TI);
U13.7(U13.Q-.7=Q) = FD2SA(BRESET1_-=CD,BWAIT1-=TE,CP-=CP,
        U12.Z-.7=D,U13.Q-.7=TI);
U13.6(U13.Q-.6=Q) = FD2SA(BRESET1_-=CD,BWAIT1-=TE,CP-=CP,
        U12.Z-.6=D,U13.Q-.6=TI);
U13.5(U13.Q-.5=Q) = FD2SA(BRESET1_-=CD,BWAIT1-=TE,CP-=CP,
        U12.Z-.5=D,U13.Q-.5=TI);
U13.4(U13.Q-.4=Q) = FD2SA(BRESET1_-=CD,BWAIT1-=TE,CP-=CP,
        U12.Z-.4=D,U13.Q-.4=TI);
U13.3(U13.Q-.3=Q) = FD2SA(BRESET1 -=CD,BWAIT1-=TE,CP-=CP,
        U12.Z-.3=D,U13.Q-.3=TI);
U13.2(U13.Q-.2=Q) = FD2SA(BRESET1_-=CD,BWAIT1-=TE,CP-=CP,
        U12.Z-.2=D,U13.Q-.2=TI);
U13.1(U13.Q-.1=Q) = FD2SA(BRESET1_-=CD,BWAIT1-=TE,CP-=CP,
        U12.Z-.1=D,U13.Q-.1=TI);
U13.0(U13.Q-.0=Q) = FD2SA(BRESET1_-=CD,BWAIT1-=TE,CP-=CP,
        U12.Z-.0=D,U13.Q-.0=TI);
U12(U12.Z-.12=Z.12,U12.Z-.11=Z.11,U12.Z-.10=Z.10,U12.Z-.9=Z.9,
        U12.Z-.8=Z.8,U12.Z-.7=Z.7,U12.Z-.6=Z.6,U12.Z-.5=Z.5,
        U12.Z-.4=Z.4,U12.Z-.3=Z.3,U12.Z-.2=Z.2,U12.Z-.1=Z.1,
        U12.Z-.0=Z.0) = MUX2X1W13X8(U0.Q3-.12=D0.12,U0.Q3-.11=D0.11,
        U0.Q3-.10=D0.10,U0.Q3-.9=D0.9,U0.Q3-.8=D0.8,U0.Q3-.7=D0.7,
        U0.Q3-.6=D0.6,U0.Q3-.5=D0.5,U0.Q3-.4=D0.4,U0.Q3-.3=D0.3,
        U0.Q3-.2=D0.2,U0.Q3-.1=D0.1,U0.Q3-.0=D0.0,BS-=S,
        U2.D1-.7=D1.7,U2.D1-.6=D1.6,U2.D1-.5=D1.5,U2.D1-.4=D1.4,
        U2.D1-.3=D1.3,U2.D1-.2=D1.2,U2.D1-.1=D1.1,U2.D1-.0=D1.0);
U18(U18.Z-.12=Z.12,U18.Z-.11=Z.11,U18.Z-.10=Z.10,U18.Z-.9=Z.9,
        U18.Z-.8=Z.8,U18.Z-.7=Z.7,U18.Z-.6=Z.6,U18.Z-.5=Z.5,
        U18.Z-.4=Z.4,U18.Z-.3=Z.3,U18.Z-.2=Z.2,U18.Z-.1=Z.1,
        U18.Z-.0=Z.0) = MUX2X1W13X8(U0.Q0-.12=D0.12,U0.Q0-.11=D0.11,
        U0.Q0-.10=D0.10,U0.Q0-.9=D0.9,U0.Q0-.8=D0.8,U0.Q0-.7=D0.7,
        U0.Q0-.6=D0.6,U0.Q0-.5=D0.5,U0.Q0-.4=D0.4,U0.Q0-.3=D0.3,
        U0.Q0-.2=D0.2,U0.Q0-.1=D0.1,U0.Q0-.0=D0.0,BS-=S,
        U2.D4-.7=D1.7,U2.D4-.6=D1.6,U2.D4-.5=D1.5,U2.D4-.4=D1.4,
        U2.D4-.3=D1.3,U2.D4-.2=D1.2,U2.D4-.1=D1.1,U2.D4-.0=D1.0);
U1(U1.Z-.12=Z.12,U1.Z-.11=Z.11,U1.Z-.10=Z.10,U1.Z-.9=Z.9,
        U1.Z-.8=Z.8,U1.Z-.7=Z.7,U1.Z-.6=Z.6,U1.Z-.5=Z.5,
        U1.Z-.4=Z.4,U1.Z-.3=Z.3,U1.Z-.2=Z.2,U1.Z-.1=Z.1,
        U1.Z-.0=Z.0) = MUX2X1W13X8(U0.Q4-.12=D0.12,U0.Q4-.11=D0.11,
        U0.Q4-.10=D0.10,U0.Q4-.9=D0.9,U0.Q4-.8=D0.8,U0.Q4-.7=D0.7,
        U0.Q4-.6=D0.6,U0.Q4-.5=D0.5,U0.Q4-.4=D0.4,U0.Q4-.3=D0.3,
        U0.Q4-.2=D0.2,U0.Q4-.1=D0.1,U0.Q4-.0=D0.0,BS-=S,
        U2.D0-.7=D1.7,U2.D0-.6=D1.6,U2.D0-.5=D1.5,U2.D0-.4=D1.4,
        U2.D0-.3=D1.3,U2.D0-.2=D1.2,U2.D0-.1=D1.1,U2.D0-.0=D1.0);
U33(BS-=Z) = B3A(S-=A);
U16(U16.Z-.12=Z.12,U16.Z-.11=Z.11,U16.Z-.10=Z.10,U16.Z-.9=Z.9,
        U16.Z-.8=Z.8,U16.Z-.7=Z.7,U16.Z-.6=Z.6,U16.Z-.5=Z.5,
        U16.Z-.4=Z.4,U16.Z-.3=Z.3,U16.Z-.2=Z.2,U16.Z-.1=Z.1,
        U16.Z-.0=Z.0) = MUX2X1W13X8(U0.Q1-.12=D0.12,U0.Q1-.11=D0.11,
        U0.Q1-.10=D0.10,U0.Q1-.9=D0.9,U0.Q1-.8=D0.8,U0.Q1-.7=D0.7,
        U0.Q1-.6=D0.6,U0.Q1-.5=D0.5,U0.Q1-.4=D0.4,U0.Q1-.3=D0.3,
        U0.Q1-.2=D0.2,U0.Q1-.1=D0.1,U0.Q1-.0=D0.0,BS-=S,
        U2.D3-.7=D1.7,U2.D3-.6=D1.6,U2.D3-.5=D1.5,U2.D3-.4=D1.4,
        U2.D3-.3=D1.3,U2.D3-.2=D1.2,U2.D3-.1=D1.1,U2.D3-.0=D1.0);
U2(U2.D0-.7=D0.7,U2.D0-.6=D0.6,U2.D0-.5=D0.5,U2.D0-.4=D0.4,
        U2.D0-.3=D0.3,U2.D0-.2=D0.2,U2.D0-.1=D0.1,U2.D0-.0=D0.0,
        U2.D1-.7=D1.7,U2.D1-.6=D1.6,U2.D1-.5=D1.5,U2.D1-.4=D1.4,
        U2.D1-.3=D1.3,U2.D1-.2=D1.2,U2.D1-.1=D1.1,U2.D1-.0=D1.0,
        U2.D2-.7=D2.7,U2.D2-.6=D2.6,U2.D2-.5=D2.5,U2.D2-.4=D2.4,
        U2.D2-.3=D2.3,U2.D2-.2=D2.2,U2.D2-.1=D2.1,U2.D2-.0=D2.0,
        U2.D4-.7=D4.7,U2.D4-.6=D4.6,U2.D4-.5=D4.5,U2.D4-.4=D4.4,
        U2.D4-.3=D4.3,U2.D4-.2=D4.2,U2.D4-.1=D4.1,U2.D4-.0=D4.0,
        U2.D3-.7=D3.7,U2.D3-.6=D3.6,U2.D3-.5=D3.5,U2.D3-.4=D3.4,
        U2.D3-.3=D3.3,U2.D3-.2=D3.2,U2.D3-.1=D3.1,U2.D3-.0=D3.0)
        = INP_MUX(BRESET3_-=RESET_,CP-=CP,BWAIT4-=WAIT,
        LST_ROW-=LAST_ROW,LST_ROW_1-=LAST_MINUS1,SCND_ROW-=SECOND_ROW,
        FRST_ROW-=FIRST_ROW,ROW_ORDR-.2=ROW_ORDR.2,
        ROW_ORDR-.1=ROW_ORDR.1,ROW_ORDR-.0=ROW_ORDR.0,STB_I-=STB_I,
        RC4-.7=RC4.7,RC4-.6=RC4.6,RC4-.5=RC4.5,RC4-.4=RC4.4,
```

```
        RC4-.3=RC4.3,RC4-.2=RC4.2,RC4-.1=RC4.1,RC4-.0=RC4.0,
        RC3-.7=RC3.7,RC3-.6=RC3.6,RC3-.5=RC3.5,RC3-.4=RC3.4,
        RC3-.3=RC3.3,RC3-.2=RC3.2,RC3-.1=RC3.1,RC3-.0=RC3.0,
        RC2-.7=RC2.7,RC2-.6=RC2.6,RC2-.5=RC2.5,RC2-.4=RC2.4,
        RC2-.3=RC2.3,RC2-.2=RC2.2,RC2-.1=RC2.1,RC2-.0=RC2.0,
        RC1-.7=RC1.7,RC1-.6=RC1.6,RC1-.5=RC1.5,RC1-.4=RC1.4,
        RC1-.3=RC1.3,RC1-.2=RC1.2,RC1-.1=RC1.1,RC1-.0=RC1.0,
        RC0-.7=RC0.7,RC0-.6=RC0.6,RC0-.5=RC0.5,RC0-.4=RC0.4,
        RC0-.3=RC0.3,RC0-.2=RC0.2,RC0-.1=RC0.1,RC0-.0=RC0.0,
        S_MODE-=S_MODE);
U11(U11.Z-.12=Z.12,U11.Z-.11=Z.11,U11.Z-.10=Z.10,U11.Z-.9=Z.9,
        U11.Z-.8=Z.8,U11.Z-.7=Z.7,U11.Z-.6=Z.6,U11.Z-.5=Z.5,
        U11.Z-.4=Z.4,U11.Z-.3=Z.3,U11.Z-.2=Z.2,U11.Z-.1=Z.1,
        U11.Z-.0=Z.0) = MUX2X1W13X8(U0.Q2-.12=D0.12,U0.Q2-.11=D0.11,
        U0.Q2-.10=D0.10,U0.Q2-.9=D0.9,U0.Q2-.8=D0.8,U0.Q2-.7=D0.7,
        U0.Q2-.6=D0.6,U0.Q2-.5=D0.5,U0.Q2-.4=D0.4,U0.Q2-.3=D0.3,
        U0.Q2-.2=D0.2,U0.Q2-.1=D0.1,U0.Q2-.0=D0.0,BS-=S,
        U2.D2-.7=D1.7,U2.D2-.6=D1.6,U2.D2-.5=D1.5,U2.D2-.4=D1.4,
        U2.D2-.3=D1.3,U2.D2-.2=D1.2,U2.D2-.1=D1.1,U2.D2-.0=D1.0);
U15.12(U15.Q-.12=Q) = FD2SA(BRESET2_-=CD,BWAIT2-=TE,CP-=CP,
        U15.Q-.12=TI,U11.Z-.12=D);
U15.11(U15.Q-.11=Q) = FD2SA(BRESET2_-=CD,BWAIT2-=TE,CP-=CP,
        U15.Q-.11=TI,U11.Z-.11=D);
U15.10(U15.Q-.10=Q) = FD2SA(BRESET2_-=CD,BWAIT2-=TE,CP-=CP,
        U15.Q-.10=TI,U11.Z-.10=D);
U15.9(U15.Q-.9=Q) = FD2SA(BRESET2_-=CD,BWAIT2-=TE,CP-=CP,
        U15.Q-.9=TI,U11.Z-.9=D);
U15.8(U15.Q-.8=Q) = FD2SA(BRESET2_-=CD,BWAIT2-=TE,CP-=CP,
        U15.Q-.8=TI,U11.Z-.8=D);
U15.7(U15.Q-.7=Q) = FD2SA(BRESET2_-=CD,BWAIT2-=TE,CP-=CP,
        U15.Q-.7=TI,U11.Z-.7=D);
U15.6(U15.Q-.6=Q) = FD2SA(BRESET2_-=CD,BWAIT2-=TE,CP-=CP,
        U15.Q-.6=TI,U11.Z-.6=D);
U15.5(U15.Q-.5=Q) = FD2SA(BRESET2_-=CD,BWAIT2-=TE,CP-=CP,
        U15.Q-.5=TI,U11.Z-.5=D);
U15.4(U15.Q-.4=Q) = FD2SA(BRESET2_-=CD,BWAIT2-=TE,CP-=CP,
        U15.Q-.4=TI,U11.Z-.4=D);
U15.3(U15.Q-.3=Q) = FD2SA(BRESET2_-=CD,BWAIT2-=TE,CP-=CP,
        U15.Q-.3=TI,U11.Z-.3=D);
U15.2(U15.Q-.2=Q) = FD2SA(BRESET2_-=CD,BWAIT2-=TE,CP-=CP,
        U15.Q-.2=TI,U11.Z-.2=D);
U15.1(U15.Q-.1=Q) = FD2SA(BRESET2_-=CD,BWAIT2-=TE,CP-=CP,
        U15.Q-.1=TI,U11.Z-.1=D);
U15.0(U15.Q-.0=Q) = FD2SA(BRESET2_-=CD,BWAIT2-=TE,CP-=CP,
        U15.Q-.0=TI,U11.Z-.0=D);
U24(U24.S-.13=S.13,U24.S-.12=S.12,U24.S-.11=S.11,U24.S-.10=S.10,
        U24.S-.9=S.9,U24.S-.8=S.8,U24.S-.7=S.7,U24.S-.6=S.6,
        U24.S-.5=S.5,U24.S-.4=S.4,U24.S-.3=S.3,U24.S-.2=S.2,
        U24.S-.1=S.1,U24.S-.0=S.0) = ADD13F(U15.Q-.12=A.12,
        U15.Q-.11=A.11,U15.Q-.10=A.10,U15.Q-.9=A.9,U15.Q-.8=A.8,
        U15.Q-.7=A.7,U15.Q-.6=A.6,U15.Q-.5=A.5,U15.Q-.4=A.4,
        U15.Q-.3=A.3,U15.Q-.2=A.2,U15.Q-.1=A.1,U15.Q-.0=A.0,
        U17.Q-.12=B.12,U17.Q-.11=B.11,U17.Q-.10=B.10,U17.Q-.9=B.9,
        U17.Q-.8=B.8,U17.Q-.7=B.7,U17.Q-.6=B.6,U17.Q-.5=B.5,
        U17.Q-.4=B.4,U17.Q-.3=B.3,U17.Q-.2=B.2,U17.Q-.1=B.1,
        U17.Q-.0=B.0);
U17.12(U17.Q-.12=Q) = FD2SA(BRESET3_-=CD,CP-=CP,BWAIT3-=TE,
        U16.Z-.12=D,U17.Q-.12=TI);
U17.11(U17.Q-.11=Q) = FD2SA(BRESET3_-=CD,CP-=CP,BWAIT3-=TE,
        U16.Z-.11=D,U17.Q-.11=TI);
U17.10(U17.Q-.10=Q) = FD2SA(BRESET3_-=CD,CP-=CP,BWAIT3-=TE,
        U16.Z-.10=D,U17.Q-.10=TI);
U17.9(U17.Q-.9=Q) = FD2SA(BRESET3_-=CD,CP-=CP,BWAIT3-=TE,
        U16.Z-.9=D,U17.Q-.9=TI);
U17.8(U17.Q-.8=Q) = FD2SA(BRESET3_-=CD,CP-=CP,BWAIT3-=TE,
        U16.Z-.8=D,U17.Q-.8=TI);
U17.7(U17.Q-.7=Q) = FD2SA(BRESET3_-=CD,CP-=CP,BWAIT3-=TE,
        U16.Z-.7=D,U17.Q-.7=TI);
U17.6(U17.Q-.6=Q) = FD2SA(BRESET3_-=CD,CP-=CP,BWAIT3-=TE,
        U16.Z-.6=D,U17.Q-.6=TI);
U17.5(U17.Q-.5=Q) = FD2SA(BRESET3_-=CD,CP-=CP,BWAIT3-=TE,
        U16.Z-.5=D,U17.Q-.5=TI);
U17.4(U17.Q-.4=Q) = FD2SA(BRESET3_-=CD,CP-=CP,BWAIT3-=TE,
        U16.Z-.4=D,U17.Q-.4=TI);
```

```
U17.3(U17.Q-.3=Q) = FD2SA(BRESET3_-=CD,CP-=CP,BWAIT3-=TE,
        U16.Z-.3=D,U17.Q-.3=TI);
U17.2(U17.Q-.2=Q) = FD2SA(BRESET3_-=CD,CP-=CP,BWAIT3-=TE,
        U16.Z-.2=D,U17.Q-.2=TI);
U17.1(U17.Q-.1=Q) = FD2SA(BRESET3_-=CD,CP-=CP,BWAIT3-=TE,
        U16.Z-.1=D,U17.Q-.1=TI);
U17.0(U17.Q-.0=Q) = FD2SA(BRESET3_-=CD,CP-=CP,BWAIT3-=TE,
        U16.Z-.0=D,U17.Q-.0=TI);
U6.15(PDO2-.15=Z) = MUX41C(SEL11-=B,SEL10-=A,U6.D2-.15=D2,
        U6.D0-.15=D0,U6.D1-.15=D1,U32.S-.15=D3);
U6.14(PDO2-.14=Z) = MUX41C(SEL11-=B,SEL10-=A,U6.D2-.14=D2,
        U6.D0-.14=D0,U6.D1-.14=D1,U32.S-.14=D3);
U6.13(PDO2-.13=Z) = MUX41C(SEL11-=B,SEL10-=A,U6.D2-.13=D2,
        U6.D0-.13=D0,U6.D1-.13=D1,U32.S-.13=D3);
U6.12(PDO2-.12=Z) = MUX41C(SEL11-=B,SEL10-=A,U6.D2-.12=D2,
        U6.D0-.12=D0,U6.D1-.12=D1,U32.S-.12=D3);
U6.11(PDO2-.11=Z) = MUX41C(SEL11-=B,SEL10-=A,U6.D2-.11=D2,
        U6.D0-.11=D0,U6.D1-.11=D1,U32.S-.11=D3);
U6.10(PDO2-.10=Z) = MUX41C(SEL11-=B,SEL10-=A,U6.D2-.10=D2,
        U6.D0-.10=D0,U6.D1-.10=D1,U32.S-.10=D3);
U6.9(PDO2-.9=Z) = MUX41C(SEL11-=B,SEL10-=A,U6.D2-.9=D2,U6.D0-.9=D0,
        U6.D1-.9=D1,U32.S-.9=D3);
U6.8(PDO2-.8=Z) = MUX41C(SEL11-=B,SEL10-=A,U6.D2-.8=D2,U6.D0-.8=D0,
        U6.D1-.8=D1,U32.S-.8=D3);
U6.7(PDO2-.7=Z) = MUX41C(SEL11-=B,SEL10-=A,U6.D2-.7=D2,U6.D0-.7=D0,
        U6.D1-.7=D1,U32.S-.7=D3);
U6.6(PDO2-.6=Z) = MUX41C(SEL11-=B,SEL10-=A,U6.D2-.6=D2,U6.D0-.6=D0,
        U6.D1-.6=D1,U32.S-.6=D3);
U6.5(PDO2-.5=Z) = MUX41C(SEL11-=B,SEL10-=A,U6.D2-.5=D2,U6.D0-.5=D0,
        U6.D1-.5=D1,U32.S-.5=D3);
U6.4(PDO2-.4=Z) = MUX41C(SEL11-=B,SEL10-=A,U6.D2-.4=D2,U6.D0-.4=D0,
        U6.D1-.4=D1,U32.S-.4=D3);
U6.3(PDO2-.3=Z) = MUX41C(SEL11-=B,SEL10-=A,U6.D2-.3=D2,U6.D0-.3=D0,
        U6.D1-.3=D1,U32.S-.3=D3);
U6.2(PDO2-.2=Z) = MUX41C(SEL11-=B,SEL10-=A,U6.D2-.2=D2,U6.D0-.2=D0,
        U6.D1-.2=D1,U32.S-.2=D3);
U6.1(PDO2-.1=Z) = MUX41C(SEL11-=B,SEL10-=A,U6.D2-.1=D2,U6.D0-.1=D0,
        U6.D1-.1=D1,U32.S-.1=D3);
U6.0(PDO2-.0=Z) = MUX41C(SEL11-=B,SEL10-=A,U6.D2-.0=D2,U6.D0-.0=D0,
        U6.D1-.0=D1,U32.S-.0=D3);
U32(U32.S-.15=S.15,U32.S-.14=S.14,U32.S-.13=S.13,U32.S-.12=S.12,
        U32.S-.11=S.11,U32.S-.10=S.10,U32.S-.9=S.9,U32.S-.8=S.8,
        U32.S-.7=S.7,U32.S-.6=S.6,U32.S-.5=S.5,U32.S-.4=S.4,
        U32.S-.3=S.3,U32.S-.2=S.2,U32.S-.1=S.1,U32.S-.0=S.0)
         = ADD15F(U26.Q-.14=A.14,U26.Q-.13=A.13,U26.Q-.12=A.12,
        U26.Q-.11=A.11,U26.Q-.10=A.10,U26.Q-.9=A.9,U26.Q-.8=A.8,
        U26.Q-.7=A.7,U26.Q-.6=A.6,U26.Q-.5=A.5,U26.Q-.4=A.4,
        U26.Q-.3=A.3,U26.Q-.2=A.2,U26.Q-.1=A.1,U26.Q-.0=A.0,
        U32.B-.14=B.14,U32.B-.13=B.13,U32.B-.12=B.12,
        U32.B-.11=B.11,U32.B-.10=B.10,U32.B-.9=B.9,U32.B-.8=B.8,
        U32.B-.7=B.7,U32.B-.6=B.6,U32.B-.5=B.5,U32.B-.4=B.4,
        U32.B-.3=B.3,U32.B-.2=B.2,U32.B-.1=B.1,U32.B-.0=B.0);
U26.14(U26.Q-.14=Q) = FD2SA(BRESET0_-=CD,CP-=CP,BWAIT3-=TE,
        U26.Q-.14=TI,U25.S-.14=D);
U26.13(U26.Q-.13=Q) = FD2SA(BRESET0_-=CD,CP-=CP,BWAIT3-=TE,
        U26.Q-.13=TI,U25.S-.13=D);
U26.12(U26.Q-.12=Q) = FD2SA(BRESET0_-=CD,CP-=CP,BWAIT3-=TE,
        U26.Q-.12=TI,U25.S-.12=D);
U26.11(U26.Q-.11=Q) = FD2SA(BRESET0_-=CD,CP-=CP,BWAIT3-=TE,
        U26.Q-.11=TI,U25.S-.11=D);
U26.10(U26.Q-.10=Q) = FD2SA(BRESET0_-=CD,CP-=CP,BWAIT3-=TE,
        U26.Q-.10=TI,U25.S-.10=D);
U26.9(U26.Q-.9=Q) = FD2SA(BRESET0_-=CD,CP-=CP,BWAIT3-=TE,
        U26.Q-.9=TI,U25.S-.9=D);
U26.8(U26.Q-.8=Q) = FD2SA(BRESET0_-=CD,CP-=CP,BWAIT3-=TE,
        U26.Q-.8=TI,U25.S-.8=D);
U26.7(U26.Q-.7=Q) = FD2SA(BRESET0_-=CD,CP-=CP,BWAIT3-=TE,
        U26.Q-.7=TI,U25.S-.7=D);
U26.6(U26.Q-.6=Q) = FD2SA(BRESET0_-=CD,CP-=CP,BWAIT3-=TE,
        U26.Q-.6=TI,U25.S-.6=D);
U26.5(U26.Q-.5=Q) = FD2SA(BRESET0_-=CD,CP-=CP,BWAIT3-=TE,
        U26.Q-.5=TI,U25.S-.5=D);
U26.4(U26.Q-.4=Q) = FD2SA(BRESET0_-=CD,CP-=CP,BWAIT3-=TE,
        U26.Q-.4=TI,U25.S-.4=D);
```

```
U26.3(U26.Q-.3=Q) = FD2SA(BRESET0_-=CD,CP-=CP,BWAIT3-=TE,
        U26.Q-.3=TI,U25.S-.3=D);
U26.2(U26.Q-.2=Q) = FD2SA(BRESET0_-=CD,CP-=CP,BWAIT3-=TE,
        U26.Q-.2=TI,U25.S-.2=D);
U26.1(U26.Q-.1=Q) = FD2SA(BRESET0_-=CD,CP-=CP,BWAIT3-=TE,
        U26.Q-.1=TI,U25.S-.1=D);
U26.0(U26.Q-.0=Q) = FD2SA(BRESET0_-=CD,CP-=CP,BWAIT3-=TE,
        U26.Q-.0=TI,U25.S-.0=D);
U31.12(U31.Q-.12=Q) = FD2SA(CP-=CP,BWAIT4-=TE,BRESET1_-=CD,
        U30.Q-.12=D,U31.Q-.12=TI);
U31.11(U31.Q-.11=Q) = FD2SA(CP-=CP,BWAIT4-=TE,BRESET1_-=CD,
        U30.Q-.11=D,U31.Q-.11=TI);
U31.10(U31.Q-.10=Q) = FD2SA(CP-=CP,BWAIT4-=TE,BRESET1_-=CD,
        U30.Q-.10=D,U31.Q-.10=TI);
U31.9(U31.Q-.9=Q) = FD2SA(CP-=CP,BWAIT4-=TE,BRESET1_-=CD,
        U30.Q-.9=D,U31.Q-.9=TI);
U31.8(U31.Q-.8=Q) = FD2SA(CP-=CP,BWAIT4-=TE,BRESET1_-=CD,
        U30.Q-.8=D,U31.Q-.8=TI);
U31.7(U31.Q-.7=Q) = FD2SA(CP-=CP,BWAIT4-=TE,BRESET1_-=CD,
        U30.Q-.7=D,U31.Q-.7=TI);
U31.6(U31.Q-.6=Q) = FD2SA(CP-=CP,BWAIT4-=TE,BRESET1_-=CD,
        U30.Q-.6=D,U31.Q-.6=TI);
U31.5(U31.Q-.5=Q) = FD2SA(CP-=CP,BWAIT4-=TE,BRESET1_-=CD,
        U30.Q-.5=D,U31.Q-.5=TI);
U31.4(U31.Q-.4=Q) = FD2SA(CP-=CP,BWAIT4-=TE,BRESET1_-=CD,
        U30.Q-.4=D,U31.Q-.4=TI);
U31.3(U31.Q-.3=Q) = FD2SA(CP-=CP,BWAIT4-=TE,BRESET1_-=CD,
        U30.Q-.3=D,U31.Q-.3=TI);
U31.2(U31.Q-.2=Q) = FD2SA(CP-=CP,BWAIT4-=TE,BRESET1_-=CD,
        U30.Q-.2=D,U31.Q-.2=TI);
U31.1(U31.Q-.1=Q) = FD2SA(CP-=CP,BWAIT4-=TE,BRESET1_-=CD,
        U30.Q-.1=D,U31.Q-.1=TI);
U31.0(U31.Q-.0=Q) = FD2SA(CP-=CP,BWAIT4-=TE,BRESET1_-=CD,
        U30.Q-.0=D,U31.Q-.0=TI);
U22.12(U22.Q-.12=Q) = FD2SA(CP-=CP,BRESET0_-=CD,U18.Z-.12=D,
        BWAIT4-=TE,U22.Q-.12=TI);
U22.11(U22.Q-.11=Q) = FD2SA(CP-=CP,BRESET0_-=CD,U18.Z-.11=D,
        BWAIT4-=TE,U22.Q-.11=TI);
U22.10(U22.Q-.10=Q) = FD2SA(CP-=CP,BRESET0_-=CD,U18.Z-.10=D,
        BWAIT4-=TE,U22.Q-.10=TI);
U22.9(U22.Q-.9=Q) = FD2SA(CP-=CP,BRESET0_-=CD,U18.Z-.9=D,BWAIT4-=TE,
        U22.Q-.9=TI);
U22.8(U22.Q-.8=Q) = FD2SA(CP-=CP,BRESET0_-=CD,U18.Z-.8=D,BWAIT4-=TE,
        U22.Q-.8=TI);
U22.7(U22.Q-.7=Q) = FD2SA(CP-=CP,BRESET0_-=CD,U18.Z-.7=D,BWAIT4-=TE,
        U22.Q-.7=TI);
U22.6(U22.Q-.6=Q) = FD2SA(CP-=CP,BRESET0_-=CD,U18.Z-.6=D,BWAIT4-=TE,
        U22.Q-.6=TI);
U22.5(U22.Q-.5=Q) = FD2SA(CP-=CP,BRESET0_-=CD,U18.Z-.5=D,BWAIT4-=TE,
        U22.Q-.5=TI);
U22.4(U22.Q-.4=Q) = FD2SA(CP-=CP,BRESET0_-=CD,U18.Z-.4=D,BWAIT4-=TE,
        U22.Q-.4=TI);
U22.3(U22.Q-.3=Q) = FD2SA(CP-=CP,BRESET0_-=CD,U18.Z-.3=D,BWAIT4-=TE,
        U22.Q-.3=TI);
U22.2(U22.Q-.2=Q) = FD2SA(CP-=CP,BRESET0_-=CD,U18.Z-.2=D,BWAIT4-=TE,
        U22.Q-.2=TI);
U22.1(U22.Q-.1=Q) = FD2SA(CP-=CP,BRESET0_-=CD,U18.Z-.1=D,BWAIT4-=TE,
        U22.Q-.1=TI);
U22.0(U22.Q-.0=Q) = FD2SA(CP-=CP,BRESET0_-=CD,U18.Z-.0=D,BWAIT4-=TE,
        U22.Q-.0=TI);
U30.12(U30.Q-.12=Q) = FD2SA(U30.Q-.12=TI,CP-=CP,BRESET3_-=CD,
        BWAIT2-=TE,U22.Q-.12=D);
U30.11(U30.Q-.11=Q) = FD2SA(U30.Q-.11=TI,CP-=CP,BRESET3_-=CD,
        BWAIT2-=TE,U22.Q-.11=D);
U30.10(U30.Q-.10=Q) = FD2SA(U30.Q-.10=TI,CP-=CP,BRESET3_-=CD,
        BWAIT2-=TE,U22.Q-.10=D);
U30.9(U30.Q-.9=Q) = FD2SA(U30.Q-.9=TI,CP-=CP,BRESET3_-=CD,
        BWAIT2-=TE,U22.Q-.9=D);
U30.8(U30.Q-.8=Q) = FD2SA(U30.Q-.8=TI,CP-=CP,BRESET3_-=CD,
        BWAIT2-=TE,U22.Q-.8=D);
U30.7(U30.Q-.7=Q) = FD2SA(U30.Q-.7=TI,CP-=CP,BRESET3_-=CD,
        BWAIT2-=TE,U22.Q-.7=D);
U30.6(U30.Q-.6=Q) = FD2SA(U30.Q-.6=TI,CP-=CP,BRESET3_-=CD,
        BWAIT2-=TE,U22.Q-.6=D);
```

```
U30.5(U30.Q-.5=Q) = FD2SA(U30.Q-.5=TI,CP-=CP,BRESET3_-=CD,
        BWAIT2-=TE,U22.Q-.5=D);
U30.4(U30.Q-.4=Q) = FD2SA(U30.Q-.4=TI,CP-=CP,BRESET3_-=CD,
        BWAIT2-=TE,U22.Q-.4=D);
U30.3(U30.Q-.3=Q) = FD2SA(U30.Q-.3=TI,CP-=CP,BRESET3_-=CD,
        BWAIT2-=TE,U22.Q-.3=D);
U30.2(U30.Q-.2=Q) = FD2SA(U30.Q-.2=TI,CP-=CP,BRESET3_-=CD,
        BWAIT2-=TE,U22.Q-.2=D);
U30.1(U30.Q-.1=Q) = FD2SA(U30.Q-.1=TI,CP-=CP,BRESET3_-=CD,
        BWAIT2-=TE,U22.Q-.1=D);
U30.0(U30.Q-.0=Q) = FD2SA(U30.Q-.0=TI,CP-=CP,BRESET3_-=CD,
        BWAIT2-=TE,U22.Q-.0=D);
U27.13(U27.Q-.13=Q) = FD2SA(U27.Q-.13=TI,BWAIT1-=TE,BRESET2_-=CD,
        CP-=CP,U24.S-.13=D);
U27.12(U27.Q-.12=Q) = FD2SA(U27.Q-.12=TI,BWAIT1-=TE,BRESET2_-=CD,
        CP-=CP,U24.S-.12=D);
U27.11(U27.Q-.11=Q) = FD2SA(U27.Q-.11=TI,BWAIT1-=TE,BRESET2_-=CD,
        CP-=CP,U24.S-.11=D);
U27.10(U27.Q-.10=Q) = FD2SA(U27.Q-.10=TI,BWAIT1-=TE,BRESET2_-=CD,
        CP-=CP,U24.S-.10=D);
U27.9(U27.Q-.9=Q) = FD2SA(U27.Q-.9=TI,BWAIT1-=TE,BRESET2_-=CD,
        CP-=CP,U24.S-.9=D);
U27.8(U27.Q-.8=Q) = FD2SA(U27.Q-.8=TI,BWAIT1-=TE,BRESET2_-=CD,
        CP-=CP,U24.S-.8=D);
U27.7(U27.Q-.7=Q) = FD2SA(U27.Q-.7=TI,BWAIT1-=TE,BRESET2_-=CD,
        CP-=CP,U24.S-.7=D);
U27.6(U27.Q-.6=Q) = FD2SA(U27.Q-.6=TI,BWAIT1-=TE,BRESET2_-=CD,
        CP-=CP,U24.S-.6=D);
U27.5(U27.Q-.5=Q) = FD2SA(U27.Q-.5=TI,BWAIT1-=TE,BRESET2_-=CD,
        CP-=CP,U24.S-.5=D);
U27.4(U27.Q-.4=Q) = FD2SA(U27.Q-.4=TI,BWAIT1-=TE,BRESET2_-=CD,
        CP-=CP,U24.S-.4=D);
U27.3(U27.Q-.3=Q) = FD2SA(U27.Q-.3=TI,BWAIT1-=TE,BRESET2_-=CD,
        CP-=CP,U24.S-.3=D);
U27.2(U27.Q-.2=Q) = FD2SA(U27.Q-.2=TI,BWAIT1-=TE,BRESET2_-=CD,
        CP-=CP,U24.S-.2=D);
U27.1(U27.Q-.1=Q) = FD2SA(U27.Q-.1=TI,BWAIT1-=TE,BRESET2_-=CD,
        CP-=CP,U24.S-.1=D);
U27.0(U27.Q-.0=Q) = FD2SA(U27.Q-.0=TI,BWAIT1-=TE,BRESET2_-=CD,
        CP-=CP,U24.S-.0=D);
U7(U7.S-.13=S.13,U7.S-.12=S.12,U7.S-.11=S.11,U7.S-.10=S.10,
        U7.S-.9=S.9,U7.S-.8=S.8,U7.S-.7=S.7,U7.S-.6=S.6,
        U7.S-.5=S.5,U7.S-.4=S.4,U7.S-.3=S.3,U7.S-.2=S.2,
        U7.S-.1=S.1,U7.S-.0=S.0) = ADD13F(U13.Q-.12=B.12,
        U13.Q-.11=B.11,U13.Q-.10=B.10,U13.Q-.9=B.9,U13.Q-.8=B.8,
        U13.Q-.7=B.7,U13.Q-.6=B.6,U13.Q-.5=B.5,U13.Q-.4=B.4,
        U13.Q-.3=B.3,U13.Q-.2=B.2,U13.Q-.1=B.1,U13.Q-.0=B.0,
        U3.Q-.12=A.12,U3.Q-.11=A.11,U3.Q-.10=A.10,U3.Q-.9=A.9,
        U3.Q-.8=A.8,U3.Q-.7=A.7,U3.Q-.6=A.6,U3.Q-.5=A.5,
        U3.Q-.4=A.4,U3.Q-.3=A.3,U3.Q-.2=A.2,U3.Q-.1=A.1,
        U3.Q-.0=A.0);
U3.12(U3.Q-.12=Q) = FD2SA(BWAIT0-=TE,U1.Z-.12=D,BRESET0_-=CD,CP-=CP,
        U3.Q-.12=TI);
U3.11(U3.Q-.11=Q) = FD2SA(BWAIT0-=TE,U1.Z-.11=D,BRESET0_-=CD,CP-=CP,
        U3.Q-.11=TI);
U3.10(U3.Q-.10=Q) = FD2SA(BWAIT0-=TE,U1.Z-.10=D,BRESET0_-=CD,CP-=CP,
        U3.Q-.10=TI);
U3.9(U3.Q-.9=Q) = FD2SA(BWAIT0-=TE,U1.Z-.9=D,BRESET0_-=CD,CP-=CP,
        U3.Q-.9=TI);
U3.8(U3.Q-.8=Q) = FD2SA(BWAIT0-=TE,U1.Z-.8=D,BRESET0_-=CD,CP-=CP,
        U3.Q-.8=TI);
U3.7(U3.Q-.7=Q) = FD2SA(BWAIT0-=TE,U1.Z-.7=D,BRESET0_-=CD,CP-=CP,
        U3.Q-.7=TI);
U3.6(U3.Q-.6=Q) = FD2SA(BWAIT0-=TE,U1.Z-.6=D,BRESET0_-=CD,CP-=CP,
        U3.Q-.6=TI);
U3.5(U3.Q-.5=Q) = FD2SA(BWAIT0-=TE,U1.Z-.5=D,BRESET0_-=CD,CP-=CP,
        U3.Q-.5=TI);
U3.4(U3.Q-.4=Q) = FD2SA(BWAIT0-=TE,U1.Z-.4=D,BRESET0_-=CD,CP-=CP,
        U3.Q-.4=TI);
U3.3(U3.Q-.3=Q) = FD2SA(BWAIT0-=TE,U1.Z-.3=D,BRESET0_-=CD,CP-=CP,
        U3.Q-.3=TI);
U3.2(U3.Q-.2=Q) = FD2SA(BWAIT0-=TE,U1.Z-.2=D,BRESET0_-=CD,CP-=CP,
        U3.Q-.2=TI);
U3.1(U3.Q-.1=Q) = FD2SA(BWAIT0-=TE,U1.Z-.1=D,BRESET0_-=CD,CP-=CP,
        U3.Q-.1=TI);
```

```
U3.0(U3.Q-.0=Q) = FD2SA(BWAIT0-=TE,U1.Z-.0=D,BRESET0_-=CD,CP-=CP,
        U3.Q-.0=TI);
U10.13(U10.Q-.13=Q) = FD2SA(CP-=CP,BRESET1_-=CD,U10.Q-.13=TI,
        U7.S-.13=D,BWAIT0-=TE);
U10.12(U10.Q-.12=Q) = FD2SA(CP-=CP,BRESET1_-=CD,U10.Q-.12=TI,
        U7.S-.12=D,BWAIT0-=TE);
U10.11(U10.Q-.11=Q) = FD2SA(CP-=CP,BRESET1_-=CD,U10.Q-.11=TI,
        U7.S-.11=D,BWAIT0-=TE);
U10.10(U10.Q-.10=Q) = FD2SA(CP-=CP,BRESET1_-=CD,U10.Q-.10=TI,
        U7.S-.10=D,BWAIT0-=TE);
U10.9(U10.Q-.9=Q) = FD2SA(CP-=CP,BRESET1_-=CD,U10.Q-.9=TI,
        U7.S-.9=D,BWAIT0-=TE);
U10.8(U10.Q-.8=Q) = FD2SA(CP-=CP,BRESET1_-=CD,U10.Q-.8=TI,
        U7.S-.8=D,BWAIT0-=TE);
U10.7(U10.Q-.7=Q) = FD2SA(CP-=CP,BRESET1_-=CD,U10.Q-.7=TI,
        U7.S-.7=D,BWAIT0-=TE);
U10.6(U10.Q-.6=Q) = FD2SA(CP-=CP,BRESET1_-=CD,U10.Q-.6=TI,
        U7.S-.6=D,BWAIT0-=TE);
U10.5(U10.Q-.5=Q) = FD2SA(CP-=CP,BRESET1_-=CD,U10.Q-.5=TI,
        U7.S-.5=D,BWAIT0-=TE);
U10.4(U10.Q-.4=Q) = FD2SA(CP-=CP,BRESET1_-=CD,U10.Q-.4=TI,
        U7.S-.4=D,BWAIT0-=TE);
U10.3(U10.Q-.3=Q) = FD2SA(CP-=CP,BRESET1_-=CD,U10.Q-.3=TI,
        U7.S-.3=D,BWAIT0-=TE);
U10.2(U10.Q-.2=Q) = FD2SA(CP-=CP,BRESET1_-=CD,U10.Q-.2=TI,
        U7.S-.2=D,BWAIT0-=TE);
U10.1(U10.Q-.1=Q) = FD2SA(CP-=CP,BRESET1_-=CD,U10.Q-.1=TI,
        U7.S-.1=D,BWAIT0-=TE);
U10.0(U10.Q-.0=Q) = FD2SA(CP-=CP,BRESET1_-=CD,U10.Q-.0=TI,
        U7.S-.0=D,BWAIT0-=TE);
U36(BRESET2_-=Z) = B3A(BRESET1_-=A);
U38.12(U38.QD-.12=QD,CNVL-.12=Q0) = SRDLYAV(NOS-.1=NOS.1,NOS-.0=NOS.0,
        DLY_POL-=DLY_POL,CP-=CP,BWAIT0-=WAIT,U38.D-.12=D,
        BRESET2_-=RESET_);
U38.11(U38.QD-.11=QD,CNVL-.11=Q0) = SRDLYAV(NOS-.1=NOS.1,NOS-.0=NOS.0,
        DLY_POL-=DLY_POL,CP-=CP,BWAIT0-=WAIT,U38.D-.11=D,
        BRESET2_-=RESET_);
U38.10(U38.QD-.10=QD,CNVL-.10=Q0) = SRDLYAV(NOS-.1=NOS.1,NOS-.0=NOS.0,
        DLY_POL-=DLY_POL,CP-=CP,BWAIT0-=WAIT,U38.D-.10=D,
        BRESET2_-=RESET_);
U38.9(U38.QD-.9=QD,CNVL-.9=Q0) = SRDLYAV(NOS-.1=NOS.1,NOS-.0=NOS.0,
        DLY_POL-=DLY_POL,CP-=CP,BWAIT0-=WAIT,U38.D-.9=D,
        BRESET2_-=RESET_);
U38.8(U38.QD-.8=QD,CNVL-.8=Q0) = SRDLYAV(NOS-.1=NOS.1,NOS-.0=NOS.0,
        DLY_POL-=DLY_POL,CP-=CP,BWAIT0-=WAIT,U38.D-.8=D,
        BRESET2_-=RESET_);
U38.7(U38.QD-.7=QD,CNVL-.7=Q0) = SRDLYAV(NOS-.1=NOS.1,NOS-.0=NOS.0,
        DLY_POL-=DLY_POL,CP-=CP,BWAIT0-=WAIT,U38.D-.7=D,
        BRESET2_-=RESET_);
U38.6(U38.QD-.6=QD,CNVL-.6=Q0) = SRDLYAV(NOS-.1=NOS.1,NOS-.0=NOS.0,
        DLY_POL-=DLY_POL,CP-=CP,BWAIT0-=WAIT,U38.D-.6=D,
        BRESET2_-=RESET_);
U38.5(U38.QD-.5=QD,CNVL-.5=Q0) = SRDLYAV(NOS-.1=NOS.1,NOS-.0=NOS.0,
        DLY_POL-=DLY_POL,CP-=CP,BWAIT0-=WAIT,U38.D-.5=D,
        BRESET2_-=RESET_);
U38.4(U38.QD-.4=QD,CNVL-.4=Q0) = SRDLYAV(NOS-.1=NOS.1,NOS-.0=NOS.0,
        DLY_POL-=DLY_POL,CP-=CP,BWAIT0-=WAIT,U38.D-.4=D,
        BRESET2_-=RESET_);
U38.3(U38.QD-.3=QD,CNVL-.3=Q0) = SRDLYAV(NOS-.1=NOS.1,NOS-.0=NOS.0,
        DLY_POL-=DLY_POL,CP-=CP,BWAIT0-=WAIT,U38.D-.3=D,
        BRESET2_-=RESET_);
U38.2(U38.QD-.2=QD,CNVL-.2=Q0) = SRDLYAV(NOS-.1=NOS.1,NOS-.0=NOS.0,
        DLY_POL-=DLY_POL,CP-=CP,BWAIT0-=WAIT,U38.D-.2=D,
        BRESET2_-=RESET_);
U38.1(U38.QD-.1=QD,CNVL-.1=Q0) = SRDLYAV(NOS-.1=NOS.1,NOS-.0=NOS.0,
        DLY_POL-=DLY_POL,CP-=CP,BWAIT0-=WAIT,U38.D-.1=D,
        BRESET2_-=RESET_);
U38.0(U38.QD-.0=QD,CNVL-.0=Q0) = SRDLYAV(NOS-.1=NOS.1,NOS-.0=NOS.0,
        DLY_POL-=DLY_POL,CP-=CP,BWAIT0-=WAIT,U38.D-.0=D,
        BRESET2_-=RESET_);
U0(U0.Q0-.12=Q0.12,U0.Q0-.11=Q0.11,U0.Q0-.10=Q0.10,U0.Q0-.9=Q0.9,
        U0.Q0-.8=Q0.8,U0.Q0-.7=Q0.7,U0.Q0-.6=Q0.6,U0.Q0-.5=Q0.5,
        U0.Q0-.4=Q0.4,U0.Q0-.3=Q0.3,U0.Q0-.2=Q0.2,U0.Q0-.1=Q0.1,
        U0.Q0-.0=Q0.0,U0.Q1-.12=Q1.12,U0.Q1-.11=Q1.11,
```

```
U0.Q1-.10=Q1.10,U0.Q1-.9=Q1.9,U0.Q1-.8=Q1.8,U0.Q1-.7=Q1.7,
U0.Q1-.6=Q1.6,U0.Q1-.5=Q1.5,U0.Q1-.4=Q1.4,U0.Q1-.3=Q1.3,
U0.Q1-.2=Q1.2,U0.Q1-.1=Q1.1,U0.Q1-.0=Q1.0,U0.Q2-.12=Q2.12,
U0.Q2-.11=Q2.11,U0.Q2-.10=Q2.10,U0.Q2-.9=Q2.9,
U0.Q2-.8=Q2.8,U0.Q2-.7=Q2.7,U0.Q2-.6=Q2.6,U0.Q2-.5=Q2.5,
U0.Q2-.4=Q2.4,U0.Q2-.3=Q2.3,U0.Q2-.2=Q2.2,U0.Q2-.1=Q2.1,
U0.Q2-.0=Q2.0,U0.Q3-.12=Q3.12,U0.Q3-.11=Q3.11,
U0.Q3-.10=Q3.10,U0.Q3-.9=Q3.9,U0.Q3-.8=Q3.8,U0.Q3-.7=Q3.7,
U0.Q3-.6=Q3.6,U0.Q3-.5=Q3.5,U0.Q3-.4=Q3.4,U0.Q3-.3=Q3.3,
U0.Q3-.2=Q3.2,U0.Q3-.1=Q3.1,U0.Q3-.0=Q3.0,U0.Q4-.12=Q4.12,
U0.Q4-.11=Q4.11,U0.Q4-.10=Q4.10,U0.Q4-.9=Q4.9,
U0.Q4-.8=Q4.8,U0.Q4-.7=Q4.7,U0.Q4-.6=Q4.6,U0.Q4-.5=Q4.5,
U0.Q4-.4=Q4.4,U0.Q4-.3=Q4.3,U0.Q4-.2=Q4.2,U0.Q4-.1=Q4.1,
U0.Q4-.0=Q4.0) = PLREGV2(BWAIT4-=WAIT,DLY_POL-=DLY_POL,
NOS-.1=NOS.1,NOS-.0=NOS.0,BRESET2_-=RESET_,CP-=CP,SE-=SE,
DUP-=DUP,PDI-.12=PDI.12,PDI-.11=PDI.11,PDI-.10=PDI.10,
PDI-.9=PDI.9,PDI-.8=PDI.8,PDI-.7=PDI.7,PDI-.6=PDI.6,
PDI-.5=PDI.5,PDI-.4=PDI.4,PDI-.3=PDI.3,PDI-.2=PDI.2,
PDI-.1=PDI.1,PDI-.0=PDI.0,PLR_CS_-=PLR_CS_,WR_-=WR_,
TST-=TST,SPR-.1=SPR.1,SPR-.0=SPR.0,U38.QD-.12=D.12,
U38.QD-.11=D.11,U38.QD-.10=D.10,U38.QD-.9=D.9,
U38.QD-.8=D.8,U38.QD-.7=D.7,U38.QD-.6=D.6,U38.QD-.5=D.5,
U38.QD-.4=D.4,U38.QD-.3=D.3,U38.QD-.2=D.2,U38.QD-.1=D.1,
U38.QD-.0=D.0);

/* extractors ******************************/

 U6.D0-.14 = (M-2);
 U6.D1-.14 = (M-2);
 U20.Z-.4 = (BWAIT4-);
 U20.Z-.0 = (BWAIT0-);
 U20.Z-.3 = (BWAIT3-);
 U20.Z-.2 = (BWAIT2-);
 U20.Z-.1 = (BWAIT1-);
 U32.S-.15 = (U38.D-.12);
 U32.S-.14 = (U38.D-.11);
 U32.S-.13 = (U38.D-.10);
 U32.S-.12 = (U38.D-.9);
 U32.S-.11 = (U38.D-.8);
 U32.S-.10 = (U38.D-.7);
 U32.S-.9 = (U38.D-.6);
 U32.S-.8 = (U38.D-.5);
 U32.S-.7 = (U38.D-.4);
 U32.S-.6 = (U38.D-.3);
 U32.S-.5 = (U38.D-.2);
 U32.S-.4 = (U38.D-.1);
 U32.S-.3 = (U38.D-.0);
 U6.D2-.14 = (U25.S-.14);
 U6.D2-.13 = (U25.S-.13);
 U6.D2-.12 = (U25.S-.12);
 U6.D2-.11 = (U25.S-.11);
 U6.D2-.10 = (U25.S-.10);
 U6.D2-.9 = (U25.S-.9);
 U6.D2-.8 = (U25.S-.8);
 U6.D2-.7 = (U25.S-.7);
 U6.D2-.6 = (U25.S-.6);
 U6.D2-.5 = (U25.S-.5);
 U6.D2-.4 = (U25.S-.4);
 U6.D2-.3 = (U25.S-.3);
 U6.D2-.2 = (U25.S-.2);
 U6.D2-.1 = (U25.S-.1);
 U6.D2-.0 = (U25.S-.0);
 U6.D2-.15 = (M-0);
 U32.B-.14 = (M-1);
 U32.B-.13 = (M-1);
 U32.B-.12 = (U31.Q-.12);
 U32.B-.11 = (U31.Q-.11);
 U32.B-.10 = (U31.Q-.10);
 U32.B-.9 = (U31.Q-.9);
 U32.B-.8 = (U31.Q-.8);
 U32.B-.7 = (U31.Q-.7);
 U32.B-.6 = (U31.Q-.6);
 U32.B-.5 = (U31.Q-.5);
```

```
    U32.B-.4 = (U31.Q-.4);
    U32.B-.3 = (U31.Q-.3);
    U32.B-.2 = (U31.Q-.2);
    U32.B-.1 = (U31.Q-.1);
    U32.B-.0 = (U31.Q-.0);
    U6.D1-.13 = (U24.S-.13);
    U6.D1-.12 = (U24.S-.12);
    U6.D1-.11 = (U24.S-.11);
    U6.D1-.10 = (U24.S-.10);
    U6.D1-.9 = (U24.S-.9);
    U6.D1-.8 = (U24.S-.8);
    U6.D1-.7 = (U24.S-.7);
    U6.D1-.6 = (U24.S-.6);
    U6.D1-.5 = (U24.S-.5);
    U6.D1-.4 = (U24.S-.4);
    U6.D1-.3 = (U24.S-.3);
    U6.D1-.2 = (U24.S-.2);
    U6.D1-.1 = (U24.S-.1);
    U6.D1-.0 = (U24.S-.0);
    U6.D1-.15 = (M-2);
    U6.D0-.15 = (M-2);
    U6.D0-.13 = (U7.S-.13);
    U6.D0-.12 = (U7.S-.12);
    U6.D0-.11 = (U7.S-.11);
    U6.D0-.10 = (U7.S-.10);
    U6.D0-.9 = (U7.S-.9);
    U6.D0-.8 = (U7.S-.8);
    U6.D0-.7 = (U7.S-.7);
    U6.D0-.6 = (U7.S-.6);
    U6.D0-.5 = (U7.S-.5);
    U6.D0-.4 = (U7.S-.4);
    U6.D0-.3 = (U7.S-.3);
    U6.D0-.2 = (U7.S-.2);
    U6.D0-.1 = (U7.S-.1);
    U6.D0-.0 = (U7.S-.0);


  /* type converters *********************/

ANNOTATIONS
{
  BUS BUS_TYPE = "DOT";
}

END MODULE;



/* * * * * * *  Contents of NET file SPTTOPV2.NET  * * * * * * */

/*****************************************************/
/*  Netlist copyright (C) 1989 LSI Logic Corporation  */
/*****************************************************/


MODULE SPTTOPV2;

INPUTS      ALE,COF_ADRIN.2,COF_ADRIN.1,COF_ADRIN.0,CP,CS_,
            INT_GT_1IN,MPA.7,MPA.6,MPA.5,MPA.4,MPA.3,MPA.2,MPA.1,
            MPA.0,PDI.15,PDI.14,PDI.13,PDI.12,PDI.11,PDI.10,PDI.9,
            PDI.8,PDI.7,PDI.6,PDI.5,PDI.4,PDI.3,PDI.2,PDI.1,PDI.0,
            PXL_EN,RC0.7,RC0.6,RC0.5,RC0.4,RC0.3,RC0.2,RC0.1,
            RC0.0,RC1.7,RC1.6,RC1.5,RC1.4,RC1.3,RC1.2,RC1.1,RC1.0,
            RC2.7,RC2.6,RC2.5,RC2.4,RC2.3,RC2.2,RC2.1,RC2.0,RC3.7,
            RC3.6,RC3.5,RC3.4,RC3.3,RC3.2,RC3.1,RC3.0,RC4.7,RC4.6,
            RC4.5,RC4.4,RC4.3,RC4.2,RC4.1,RC4.0,RDY_I,RD_,RESET_,
            STOP,STRT,TST,WAIT,WR_,XSCNIN,YDWN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
            CNVL.4,CNVL.3,CNVL.2,CNVL.1,CNVL.0,MPD_OE_,PDO.15,
            PDO.14,PDO.13,PDO.12,PDO.11,PDO.10,PDO.9,PDO.8,PDO.7,
            PDO.6,PDO.5,PDO.4,PDO.3,PDO.2,PDO.1,PDO.0,REQ_I,REQ_O,
```

```
            STB_I,YINT,YINTSND;

LEVEL FUNCTION;
DEFINE
  /* implicit connectors *******************/

    CLRXCNT_- = (CLRXCNT_);
    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    YDWN- = (YDWN);
    YUP- = (YUP);
    COF_ADRIN-.2 = (COF_ADRIN.2);
    COF_ADRIN-.1 = (COF_ADRIN.1);
    COF_ADRIN-.0 = (COF_ADRIN.0);
    INT_GT_1IN- = (INT_GT_1IN);
    RDY_I- = (RDY_I);
    STRT- = (STRT);
    STOP- = (STOP);
    WAIT- = (WAIT);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    WR_- = (WR_);
    TST- = (TST);
    XSCNIN- = (XSCNIN);
    YSCNIN- = (YSCNIN);
    CP- = (CP);
    RC0-.7 = (RC0.7);
    RC0-.6 = (RC0.6);
    RC0-.5 = (RC0.5);
    RC0-.4 = (RC0.4);
    RC0-.3 = (RC0.3);
    RC0-.2 = (RC0.2);
    RC0-.1 = (RC0.1);
    RC0-.0 = (RC0.0);
    RC1-.7 = (RC1.7);
    RC1-.6 = (RC1.6);
    RC1-.5 = (RC1.5);
    RC1-.4 = (RC1.4);
    RC1-.3 = (RC1.3);
    RC1-.2 = (RC1.2);
    RC1-.1 = (RC1.1);
    RC1-.0 = (RC1.0);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC3-.7 = (RC3.7);
    RC3-.6 = (RC3.6);
    RC3-.5 = (RC3.5);
    RC3-.4 = (RC3.4);
    RC3-.3 = (RC3.3);
    RC3-.2 = (RC3.2);
    RC3-.1 = (RC3.1);
```

```
RC3-.0 = (RC3.0);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
REQ_O- = (REQ_O);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
YINT- = (YINT);
YINTSND- = (YINTSND);
REQ_I- = (REQ_I);
STB_I- = (STB_I);
MPD_OE_- = (MPD_OE_);
CS_- = (CS_);
RD_- = (RD_);
ALE- = (ALE);
ALE- = (ALE);
MPA-.7 = (MPA.7);
MPA-.6 = (MPA.6);
MPA-.5 = (MPA.5);
MPA-.4 = (MPA.4);
MPA-.3 = (MPA.3);
MPA-.2 = (MPA.2);
MPA-.1 = (MPA.1);
MPA-.0 = (MPA.0);
RESET_- = (RESET_);
RESET_- = (RESET_);
PXL_EN- = (PXL_EN);


/* part instances ***************************/

U1(U1.PA-.6=PA.6,U1.PA-.5=PA.5,U1.PA-.4=PA.4,U1.PA-.3=PA.3,
        U1.PA-.2=PA.2,U1.PA-.1=PA.1,U1.PA-.0=PA.0,U1.SEL11-=SEL11,
        U1.SEL10-=SEL10,U1.SEL01-=SEL01,U1.SEL00-=SEL00,
        U1.PLR_CS_-=PLR_CS_,U1.XDIM_CS_-=XDIM_CS_,
        U1.YDIM_CS_-=YDIM_CS_,U1.XAU_HCS_-=XAU_HCS_,
        U1.XAU_LCS_-=XAU_LCS_,U1.YAU_HCS_-=YAU_HCS_,
        U1.YAU_LCS_-=YAU_LCS_,U1.CMEM_CS_-=CMEM_CS_,
        U1.MR_CS_-=MR_CS_,MPD_OE_-=MPD_OE_) = HBIV1(RESET_-=RESET_,
        CS_-=CS_,RD_-=RD_,ALE-=ALE,MPA-.7=MPA.7,MPA-.6=MPA.6,
        MPA-.5=MPA.5,MPA-.4=MPA.4,MPA-.3=MPA.3,MPA-.2=MPA.2,
        MPA-.1=MPA.1,MPA-.0=MPA.0);
```

```
U0(CLRXCNT_-=CLRXCNT_,BMYL-.4=BMYL.4,BMYL-.3=BMYL.3,BMYL-.2=BMYL.2,
        BMYL-.1=BMYL.1,BMYL-.0=BMYL.0,REQ_O-=REQ_O,CNVL-.12=CNVL.12,
        CNVL-.11=CNVL.11,CNVL-.10=CNVL.10,CNVL-.9=CNVL.9,
        CNVL-.8=CNVL.8,CNVL-.7=CNVL.7,CNVL-.6=CNVL.6,CNVL-.5=CNVL.5,
        CNVL-.4=CNVL.4,CNVL-.3=CNVL.3,CNVL-.2=CNVL.2,CNVL-.1=CNVL.1,
        CNVL-.0=CNVL.0,PDO-.15=PDO.15,PDO-.14=PDO.14,PDO-.13=PDO.13,
        PDO-.12=PDO.12,PDO-.11=PDO.11,PDO-.10=PDO.10,PDO-.9=PDO.9,
        PDO-.8=PDO.8,PDO-.7=PDO.7,PDO-.6=PDO.6,PDO-.5=PDO.5,
        PDO-.4=PDO.4,PDO-.3=PDO.3,PDO-.2=PDO.2,PDO-.1=PDO.1,
        PDO-.0=PDO.0,YINT-=YINT,YINTSND-=YINTSND,REQ_I-=REQ_I,
        STB_I-=STB_I) = SPTCOREV2(YDWN-=YDWN,YUP-=YUP,
        COF_ADRIN-.2=COF_ADRIN.2,COF_ADRIN-.1=COF_ADRIN.1,
        COF_ADRIN-.0=COF_ADRIN.0,INT_GT_1IN-=INT_GT_1IN,
        RDY_I-=RDY_I,U1.PA-.6=PA.6,U1.PA-.5=PA.5,U1.PA-.4=PA.4,
        U1.PA-.3=PA.3,U1.PA-.2=PA.2,U1.PA-.1=PA.1,U1.PA-.0=PA.0,
        U1.SEL11-=SEL11,U1.SEL10-=SEL10,U1.SEL01-=SEL01,
        U1.SEL00-=SEL00,U1.PLR_CS_-=PLR_CS_,U1.XDIM_CS_-=XDIM_CS_,
        U1.YDIM_CS_-=YDIM_CS_,U1.XAU_HCS_-=XAU_HCS_,
        U1.XAU_LCS_-=XAU_LCS_,U1.YAU_HCS_-=YAU_HCS_,
        U1.YAU_LCS_-=YAU_LCS_,U1.CMEM_CS_-=CMEM_CS_,
        U1.MR_CS_-=MR_CS_,STRT-=STRT,STOP-=STOP,WAIT-=WAIT,
        PDI-.15=PDI.15,PDI-.14=PDI.14,PDI-.13=PDI.13,PDI-.12=PDI.12,
        PDI-.11=PDI.11,PDI-.10=PDI.10,PDI-.9=PDI.9,PDI-.8=PDI.8,
        PDI-.7=PDI.7,PDI-.6=PDI.6,PDI-.5=PDI.5,PDI-.4=PDI.4,
        PDI-.3=PDI.3,PDI-.2=PDI.2,PDI-.1=PDI.1,PDI-.0=PDI.0,
        ALE-=ALE,WR_-=WR_,TST-=TST,XSCNIN-=XSCNIN,YSCNIN-=YSCNIN,
        CP-=CP,RC0-.7=RC0.7,RC0-.6=RC0.6,RC0-.5=RC0.5,RC0-.4=RC0.4,
        RC0-.3=RC0.3,RC0-.2=RC0.2,RC0-.1=RC0.1,RC0-.0=RC0.0,
        RC1-.7=RC1.7,RC1-.6=RC1.6,RC1-.5=RC1.5,RC1-.4=RC1.4,
        RC1-.3=RC1.3,RC1-.2=RC1.2,RC1-.1=RC1.1,RC1-.0=RC1.0,
        RC2-.7=RC2.7,RC2-.6=RC2.6,RC2-.5=RC2.5,RC2-.4=RC2.4,
        RC2-.3=RC2.3,RC2-.2=RC2.2,RC2-.1=RC2.1,RC2-.0=RC2.0,
        RC3-.7=RC3.7,RC3-.6=RC3.6,RC3-.5=RC3.5,RC3-.4=RC3.4,
        RC3-.3=RC3.3,RC3-.2=RC3.2,RC3-.1=RC3.1,RC3-.0=RC3.0,
        RC4-.7=RC4.7,RC4-.6=RC4.6,RC4-.5=RC4.5,RC4-.4=RC4.4,
        RC4-.3=RC4.3,RC4-.2=RC4.2,RC4-.1=RC4.1,RC4-.0=RC4.0,
        RESET_-=RESET_,PXL_EN-=PXL_EN);

  /* extractors *******************************/


  /* type converters *********************/

ANNOTATIONS
{
  BUS BUS_TYPE = "DOT";
}

END MODULE;


/* * * * * * *  Contents of NET file MR6.NET  * * * * * * */

/*****************************************************/
/*  Netlist copyright (C) 1989 LSI Logic Corporation  */
/*****************************************************/


MODULE MR6;

INPUTS      CS_,D.5,D.4,D.3,D.2,D.1,D.0,RESET_,WR_;
OUTPUTS     Q.5,Q.4,Q.3,Q.2,Q.1,Q.0;

LEVEL FUNCTION;
DEFINE
  /* implicit connectors *******************/

    RESET_- = (RESET_);
    D-.5 = (D.5);
    D-.4 = (D.4);
    D-.3 = (D.3);
```

```
    D-.2 = (D.2);
    D-.1 = (D.1);
    D-.0 = (D.0);
    WR_- = (WR_);
    CS_- = (CS_);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);

  /* part instances ***************************/

    U1(U1.Z-=Z) = OR2B(WR_-=B,CS_-=A);
    U0.5(Q-.5=Q) = FD2A(RESET_-=CD,D-.5=D,U1.Z-=CP);
    U0.4(Q-.4=Q) = FD2A(RESET_-=CD,D-.4=D,U1.Z-=CP);
    U0.3(Q-.3=Q) = FD2A(RESET_-=CD,D-.3=D,U1.Z-=CP);
    U0.2(Q-.2=Q) = FD2A(RESET_-=CD,D-.2=D,U1.Z-=CP);
    U0.1(Q-.1=Q) = FD2A(RESET_-=CD,D-.1=D,U1.Z-=CP);
    U0.0(Q-.0=Q) = FD2A(RESET_-=CD,D-.0=D,U1.Z-=CP);

  /* extractors ********************************/


  /* type converters *********************/

ANNOTATIONS
{
  BUS BUS_TYPE = "DOT";
}

END MODULE;


/* * * * * * *  Contents of NET file CNVSEQV1CR.NET  * * * * * * */

/********************************************************/
/*  Netlist copyright (C) 1989 LSI Logic Corporation  */
/********************************************************/


MODULE CNVSEQV1CR;

INPUTS      EOC,EOR,SNGL_CYC,SNGL_FRM,SNGL_LIN,STBIT0I,STBIT1I,
            STBIT2I,STBIT3I,STOP,STRT;
OUTPUTS     CLRYAU,ENYAU,HLT,STBIT0O,STBIT1O,STBIT2O,STBIT3O,STF;

LEVEL FUNCTION;
DEFINE
  /* implicit connectors *******************/

    STBIT2I- = (STBIT2I);
    STBIT1O- = (STBIT1O);
    ENYAU- = (ENYAU);
    STF- = (STF);
    STBIT0O- = (STBIT0O);
    STBIT0I- = (STBIT0I);
    EOC- = (EOC);
    STBIT2O- = (STBIT2O);
    HLT- = (HLT);
    CLRYAU- = (CLRYAU);
    SNGL_LIN- = (SNGL_LIN);
    SNGL_FRM- = (SNGL_FRM);
    SNGL_CYC- = (SNGL_CYC);
    STOP- = (STOP);
    STBIT3I- = (STBIT3I);
    STRT- = (STRT);
    STBIT1I- = (STBIT1I);
    EOR- = (EOR);
    STBIT3O- = (STBIT3O);
```

```
/* part instances ****************************/

M4(M4.Z-=Z) = N1C(STBIT2I-=A);
M139(M139.Z-=Z) = N1C(M4.Z-=A);
M13(M13.Z-=Z) = N1B(EOR-=A);
M14(M14.Z-=Z) = AND2B(M13.Z-=B,M2.Z-=A);
M31(M31.Z-=Z) = AND2C(M30.Z-=A,M2.Z-=B);
M11(M11.Z-=Z) = AND2B(M139.Z-=A,STBIT3I-=B);
M15(M15.Z-=Z) = AND2C(M9.Z-=A,STBIT1I-=B);
M42(M42.Z-=Z) = ND3B(M19.Z-=A,M10.Z-=B,M17.Z-=C);
M2(M2.Z-=Z) = N1C(STOP-=A);
M5(M5.Z-=Z) = N1C(STBIT1I-=A);
M10(M10.Z-=Z) = AND2C(M5.Z-=B,M9.Z-=A);
M108(M108.Z-=Z) = NR2B(M107.Z-=B,M106.Z-=A);
M119(M119.Z-=Z) = AND2B(M77.Z-=B,M52.Z-=A);
M17(M17.Z-=Z) = AND2B(M16.Z-=B,M139.Z-=A);
M45(M45.Z-=Z) = AND2C(M4.Z-=A,M16.Z-=B);
M16(M16.Z-=Z) = N1C(STBIT3I-=A);
M55(M55.Z-=Z) = AND3B(M5.Z-=A,M4.Z-=B,M16.Z-=C);
M133(M133.Z-=Z) = NR2B(M131.Z-=A,M132.Z-=B);
M9(M9.Z-=Z) = N1C(STBIT0I-=A);
M27(M27.Z-=Z) = AND2C(M5.Z-=B,STBIT0I-=A);
M93(M93.Z-=Z) = ND3B(M45.Z-=C,M27.Z-=B,M19.Z-=A);
M123(M123.Z-=Z) = AND2B(M73.Z-=B,M68.Z-=A);
M124(STBIT0O-=Z) = ND3B(M93.Z-=C,M123.Z-=B,M122.Z-=A);
M122(M122.Z-=Z) = AND2B(M29.Z-=B,M22.Z-=A);
M24(M24.Z-=Z) = AND2B(M9.Z-=A,M139.Z-=B);
M1(M1.Z-=Z) = N1B(EOC-=A);
M23(M23.Z-=Z) = AND2B(M2.Z-=A,EOC-=B);
M25(M25.Z-=Z) = ND3B(M24.Z-=B,M23.Z-=A,STBIT3I-=C);
M34(M34.Z-=Z) = ND3B(M31.Z-=A,M10.Z-=B,M28.Z-=C);
M117(STBIT2O-=Z) = ND3B(M115.Z-=B,M112.Z-=A,M116.Z-=C);
M110(M110.Z-=Z) = ND2B(M12.Z-=A,M18.Z-=B);
M112(M112.Z-=Z) = NR2B(M111.Z-=B,M110.Z-=A);
M99(M99.Z-=Z) = ND3B(M30.Z-=A,M4.Z-=C,M9.Z-=B);
M142(M142.Z-=Z) = ND3B(M99.Z-=C,M97.Z-=B,M94.Z-=A);
M143(M143.Z-=Z) = NR2B(M142.Z-=B,M141.Z-=A);
M144(HLT-=Z) = ND3B(M143.Z-=C,M140.Z-=B,M137.Z-=A);
M137(M137.Z-=Z) = NR2B(M135.Z-=A,M136.Z-=B);
M136(M136.Z-=Z) = ND2B(M38.Z-=B,M29.Z-=A);
M148(M148.Z-=Z) = AND2B(M81.Z-=B,M73.Z-=A);
M147(M147.Z-=Z) = AND2B(M56.Z-=B,M52.Z-=A);
M149(CLRYAU-=Z) = ND3B(M148.Z-=C,M147.Z-=B,M146.Z-=A);
M146(M146.Z-=Z) = AND2B(M46.Z-=B,M29.Z-=A);
M101(M101.Z-=Z) = ND2B(M38.Z-=A,M46.Z-=B);
M111(M111.Z-=Z) = ND2B(M34.Z-=A,M38.Z-=B);
M126(M126.Z-=Z) = ND3B(M34.Z-=C,M29.Z-=B,M25.Z-=A);
M135(M135.Z-=Z) = ND3B(M3.Z-=A,M22.Z-=B,M25.Z-=C);
M22(M22.Z-=Z) = ND3B(M21.Z-=C,M19.Z-=A,M20.Z-=B);
M125(M125.Z-=Z) = ND3B(M12.Z-=A,M22.Z-=C,M18.Z-=B);
M127(M127.Z-=Z) = NR2B(M126.Z-=B,M125.Z-=A);
M134(STF-=Z) = ND3B(M133.Z-=C,M130.Z-=B,M127.Z-=A);
M130(M130.Z-=Z) = NR2B(M129.Z-=B,M128.Z-=A);
M129(M129.Z-=Z) = ND3B(M60.Z-=A,M73.Z-=C,M68.Z-=B);
M104(M104.Z-=Z) = ND2B(M64.Z-=A,M68.Z-=B);
M105(M105.Z-=Z) = NR2B(M104.Z-=B,M103.Z-=A);
M103(M103.Z-=Z) = ND2B(M60.Z-=B,M56.Z-=A);
M114(M114.Z-=Z) = ND2B(M64.Z-=B,M60.Z-=A);
M115(M115.Z-=Z) = NR2B(M114.Z-=B,M113.Z-=A);
M113(M113.Z-=Z) = ND2B(M56.Z-=B,M52.Z-=A);
M54(M54.Z-=Z) = AND2B(M9.Z-=B,STRT-=A);
M56(M56.Z-=Z) = ND3C(M55.Z-=C,M54.Z-=B,M53.Z-=A);
M53(M53.Z-=Z) = AND2B(M48.Z-=B,SNGL_LIN-=A);
M47(M47.Z-=Z) = N1B(SNGL_LIN-=A);
M69(M69.Z-=Z) = N1B(SNGL_FRM-=A);
M49(M49.Z-=Z) = AND3B(M47.Z-=B,M48.Z-=C,SNGL_FRM-=A);
M70(M70.Z-=Z) = AND3B(M69.Z-=A,M47.Z-=B,M48.Z-=C);
M48(M48.Z-=Z) = N1B(SNGL_CYC-=A);
M43(M43.Z-=Z) = AND2B(STRT-=B,SNGL_CYC-=A);
M46(M46.Z-=Z) = ND3B(M45.Z-=C,M10.Z-=B,M43.Z-=A);
M52(M52.Z-=Z) = ND3C(M50.Z-=B,M49.Z-=A,M45.Z-=C);
M128(M128.Z-=Z) = ND3B(M56.Z-=C,M46.Z-=A,M52.Z-=B);
M140(M140.Z-=Z) = NR2B(M128.Z-=A,M106.Z-=B);
M106(M106.Z-=Z) = ND2B(M73.Z-=A,M77.Z-=B);
```

```
    M73(M73.Z-=Z) = ND3C(M70.Z-=A,M50.Z-=B,M45.Z-=C);
    M50(M50.Z-=Z) = AND3B(M5.Z-=C,M9.Z-=B,STRT-=A);
    M3(M3.Z-=Z) = ND3B(M5.Z-=B,M4.Z-=C,STOP-=A);
    M82(M82.Z-=Z) = ND2B(M9.Z-=B,STOP-=A);
    M141(M141.Z-=Z) = ND3B(M93.Z-=C,M82.Z-=A,M89.Z-=B);
    M131(M131.Z-=Z) = ND4B(M93.Z-=D,M85.Z-=B,M89.Z-=C,M77.Z-=A);
    M107(M107.Z-=Z) = ND2B(M97.Z-=B,M85.Z-=A);
    M97(M97.Z-=Z) = ND3B(M19.Z-=A,M96.Z-=B,STBIT3I-=C);
    M60(M60.Z-=Z) = ND3B(M45.Z-=C,M19.Z-=A,M15.Z-=B);
    M64(M64.Z-=Z) = ND3B(M31.Z-=A,M15.Z-=B,M11.Z-=C);
    M81(M81.Z-=Z) = ND3B(M19.Z-=A,M15.Z-=B,M11.Z-=C);
    M116(M116.Z-=Z) = AND3B(M89.Z-=C,M81.Z-=B,M77.Z-=A);
    M77(M77.Z-=Z) = ND3C(M45.Z-=C,M31.Z-=A,M27.Z-=B);
    M89(M89.Z-=Z) = ND3B(M31.Z-=A,M10.Z-=B,M17.Z-=C);
    M18(M18.Z-=Z) = ND3C(M15.Z-=B,M17.Z-=C,M14.Z-=A);
    M68(M68.Z-=Z) = ND3C(M27.Z-=B,M28.Z-=C,M14.Z-=A);
    M145(ENYAU-=Z) = ND4B(M42.Z-=C,M12.Z-=A,M68.Z-=D,M18.Z-=B);
    M118(M118.Z-=Z) = AND2B(M25.Z-=B,M18.Z-=A);
    M121(STBIT1O-=Z) = ND3B(M120.Z-=C,M119.Z-=B,M118.Z-=A);
    M120(M120.Z-=Z) = AND2B(M98.Z-=B,M94.Z-=A);
    M132(M132.Z-=Z) = ND3B(M97.Z-=B,M98.Z-=C,M94.Z-=A);
    M94(M94.Z-=Z) = ND4B(M9.Z-=B,M2.Z-=A,STBIT3I-=D,STBIT1I-=C);
    M28(M28.Z-=Z) = AND2B(M4.Z-=A,STBIT3I-=B);
    M96(M96.Z-=Z) = AND2B(M4.Z-=B,M9.Z-=A);
    M98(M98.Z-=Z) = ND4B(M30.Z-=A,M9.Z-=C,M2.Z-=B,STBIT1I-=D);
    M30(M30.Z-=Z) = N1B(STRT-=A);
    M19(M19.Z-=Z) = AND2C(STRT-=A,M2.Z-=B);
    M8(M8.Z-=Z) = AND2B(M1.Z-=B,M2.Z-=A);
    M12(M12.Z-=Z) = ND3C(M10.Z-=B,M11.Z-=C,M8.Z-=A);
    M85(M85.Z-=Z) = ND3B(M19.Z-=A,M10.Z-=B,M139.Z-=C);
    M21(M21.Z-=Z) = AND3B(M16.Z-=C,M139.Z-=B,STBIT1I-=A);
    M37(M37.Z-=Z) = AND2B(M139.Z-=B,STBIT1I-=A);
    M38(M38.Z-=Z) = ND3B(M31.Z-=A,M37.Z-=C,M20.Z-=B);
    M20(M20.Z-=Z) = AND2B(M9.Z-=B,EOR-=A);
    M26(M26.Z-=Z) = AND2B(M2.Z-=A,EOR-=B);
    M29(M29.Z-=Z) = ND3C(M27.Z-=B,M28.Z-=C,M26.Z-=A);
    M100(M100.Z-=Z) = ND2B(M12.Z-=A,M29.Z-=B);
    M102(M102.Z-=Z) = NR2B(M101.Z-=B,M100.Z-=A);
    M109(STBIT3O-=Z) = ND3B(M108.Z-=C,M105.Z-=B,M102.Z-=A);

  /* extractors *****************************/


  /* type converters *********************/

ANNOTATIONS
{
  BUS BUS_TYPE = "DOT";
}

END MODULE;


/* * * * * * *  Contents of NET file YSEQV4CR.NET  * * * * * * */

/*******************************************************/
/*  Netlist copyright (C) 1989 LSI Logic Corporation  */
/*******************************************************/


MODULE YSEQV4CR;

INPUTS      CO,EOR,INC,STBIT0I,STBIT1I,STBIT2I,STRT_FLG;
OUTPUTS     CI,FR,IR,LD_,LR,LR_1,SR,STBIT0O,STBIT1O,STBIT2O;

LEVEL FUNCTION;
DEFINE
  /* implicit connectors ******************/

    FR- = (FR);
    CO- = (CO);
    INC- = (INC);
```

```
  STBIT0I- = (STBIT0I);
  STRT_FLG- = (STRT_FLG);
  LD_- = (LD_);
  SR- = (SR);
  STBIT2I- = (STBIT2I);
  IR- = (IR);
  STBIT0O- = (STBIT0O);
  STBIT1I- = (STBIT1I);
  EOR- = (EOR);
  LR_1- = (LR_1);
  CI- = (CI);
  STBIT1O- = (STBIT1O);
  LR- = (LR);
  STBIT2O- = (STBIT2O);


/* part instances ***************************/

  M66(FR-=Z) = N1B(M2.Z-=A);
  M40(M40.Z-=Z) = AND2B(M37.Z-=A,CO-=B);
  M33(M33.Z-=Z) = ND4B(CO-=B,INC-=C,M37.Z-=A,M3.Z-=D);
  M1(M1.Z-=Z) = AND2C(M37.Z-=A,INC-=B);
  M9(M9.Z-=Z) = N1B(INC-=A);
  M41(M41.Z-=Z) = AND2B(M9.Z-=A,M38.Z-=B);
  M29(M29.Z-=Z) = ND3C(M28.Z-=C,M27.Z-=B,M10.Z-=A);
  M28(M28.Z-=Z) = AND2B(M3.Z-=B,STBIT1I-=A);
  M14(M14.Z-=Z) = N1C(STBIT1I-=A);
  M4(M4.Z-=Z) = N1C(STBIT0I-=A);
  M37(M37.Z-=Z) = N1C(M23.Z-=A);
  M23(M23.Z-=Z) = N1C(STRT_FLG-=A);
  M57(LD_-=Z) = ND3B(M54.Z-=A,M55.Z-=B,M56.Z-=C);
  M59(SR-=Z) = ND2B(M8.Z-=A,M12.Z-=B);
  M12(M12.Z-=Z) = ND3C(M10.Z-=A,M7.Z-=B,STBIT2I-=C);
  M3(M3.Z-=Z) = N1C(STBIT2I-=A);
  M8(M8.Z-=Z) = ND3C(M1.Z-=A,M7.Z-=B,STBIT2I-=C);
  M65(IR-=Z) = ND3B(M62.Z-=A,M63.Z-=B,M64.Z-=C);
  M62(M62.Z-=Z) = AND2B(M8.Z-=B,M2.Z-=A);
  M53(STBIT0O-=Z) = ND3B(M29.Z-=C,M8.Z-=A,M22.Z-=B);
  M22(M22.Z-=Z) = ND3B(M38.Z-=B,M37.Z-=A,M14.Z-=C);
  M55(M55.Z-=Z) = AND3B(M24.Z-=B,M22.Z-=A,M29.Z-=C);
  M24(M24.Z-=Z) = ND2B(M23.Z-=A,M3.Z-=B);
  M44(M44.Z-=Z) = ND2B(M23.Z-=A,M14.Z-=B);
  M56(M56.Z-=Z) = AND3B(M45.Z-=C,M44.Z-=B,M43.Z-=A);
  M45(M45.Z-=Z) = ND2B(M23.Z-=A,M4.Z-=B);
  M38(M38.Z-=Z) = N1C(M4.Z-=A);
  M2(M2.Z-=Z) = ND4C(M3.Z-=D,M37.Z-=A,M4.Z-=B,STBIT1I-=C);
  M7(M7.Z-=Z) = AND2B(M4.Z-=A,STBIT1I-=B);
  M18(M18.Z-=Z) = AND2B(M38.Z-=A,STBIT1I-=B);
  M32(M32.Z-=Z) = ND3B(M18.Z-=B,M3.Z-=C,M1.Z-=A);
  M19(M19.Z-=Z) = ND3B(M17.Z-=A,M18.Z-=B,M3.Z-=C);
  M17(M17.Z-=Z) = AND2B(M37.Z-=A,EOR-=B);
  M26(M26.Z-=Z) = N1B(EOR-=A);
  M27(M27.Z-=Z) = AND2B(M26.Z-=A,M38.Z-=B);
  M15(M15.Z-=Z) = AND2B(M14.Z-=B,M38.Z-=A);
  M46(M46.Z-=Z) = AND3B(M16.Z-=B,M19.Z-=C,M12.Z-=A);
  M60(LR_1-=Z) = ND2B(M16.Z-=A,M36.Z-=B);
  M16(M16.Z-=Z) = ND3B(STBIT2I-=C,M10.Z-=A,M15.Z-=B);
  M10(M10.Z-=Z) = AND2B(M9.Z-=B,M37.Z-=A);
  M20(M20.Z-=Z) = ND4B(INC-=B,M38.Z-=C,M37.Z-=A,M14.Z-=D);
  M58(CI-=Z) = ND3B(M39.Z-=C,M8.Z-=A,M20.Z-=B);
  M48(M48.Z-=Z) = AND2B(M42.Z-=B,M39.Z-=A);
  M42(M42.Z-=Z) = ND3B(M14.Z-=C,M40.Z-=A,M41.Z-=B);
  M43(M43.Z-=Z) = ND4B(STBIT2I-=D,M4.Z-=B,M37.Z-=A,M14.Z-=C);
  M52(STBIT1O-=Z) = ND3B(M50.Z-=A,M51.Z-=B,M43.Z-=C);
  M50(M50.Z-=Z) = AND2B(M12.Z-=B,M2.Z-=A);
  M54(M54.Z-=Z) = AND3B(M8.Z-=B,M12.Z-=C,M2.Z-=A);
  M63(M63.Z-=Z) = AND2B(M19.Z-=B,M12.Z-=A);
  M61(LR-=Z) = ND3B(M29.Z-=B,M19.Z-=A,M32.Z-=C);
  M64(M64.Z-=Z) = AND3B(M22.Z-=A,M32.Z-=C,M29.Z-=B);
  M51(M51.Z-=Z) = AND2B(M36.Z-=B,M29.Z-=A);
  M36(M36.Z-=Z) = ND3B(STBIT2I-=C,M15.Z-=B,M1.Z-=A);
  M39(M39.Z-=Z) = ND3B(M7.Z-=B,M3.Z-=C,M1.Z-=A);
  M21(M21.Z-=Z) = ND4B(M4.Z-=B,M37.Z-=A,M14.Z-=C,M3.Z-=D);
  M47(M47.Z-=Z) = AND3B(M33.Z-=C,M32.Z-=B,M21.Z-=A);
  M49(STBIT2O-=Z) = ND3B(M48.Z-=C,M46.Z-=A,M47.Z-=B);
```

```
  /* extractors ******************************/


  /* type converters *********************/

ANNOTATIONS
{
  BUS BUS_TYPE = "DOT";
}

END MODULE;


/* * * * * * *  Contents of NET file CNVSEQV1FN.NET  * * * * * * */

/*****************************************************/
/*  Netlist copyright (C) 1989 LSI Logic Corporation  */
/*****************************************************/


MODULE CNVSEQV1FN;

INPUTS      CP,EOC,EOR,RESET_,SNGL_CYC,SNGL_FRM,SNGL_LIN,STOP,
            STRT;
OUTPUTS     CLRYAU,ENYAU,HLT,STF;

LEVEL FUNCTION;
DEFINE
  /* implicit connectors *******************/

    EOC- = (EOC);
    EOR- = (EOR);
    SNGL_CYC- = (SNGL_CYC);
    SNGL_FRM- = (SNGL_FRM);
    SNGL_LIN- = (SNGL_LIN);
    STRT- = (STRT);
    HLT- = (HLT);
    STF- = (STF);
    ENYAU- = (ENYAU);
    CLRYAU- = (CLRYAU);
    RESET_- = (RESET_);
    CP- = (CP);
    STOP- = (STOP);


  /* part instances **************************/

    U2(HLT-=Q) = FD4A(CORE.HLT-=D,CP-=CP,RESET_-=SD);
    M___4(M___4.Q-=Q) = FD2A(CORE.STBIT0O-=D,RESET_-=CD,CP-=CP);
    U3(STF-=Q) = FD2A(CORE.STF-=D,CP-=CP,RESET_-=CD);
    U1(ENYAU-=Q) = FD2A(CORE.ENYAU-=D,CP-=CP,RESET_-=CD);
    U0(CLRYAU-=Q) = FD2A(CORE.CLRYAU-=D,CP-=CP,RESET_-=CD);
    M___2(M___2.Q-=Q) = FD2A(CORE.STBIT2O-=D,RESET_-=CD,CP-=CP);
    M___3(M___3.Q-=Q) = FD2A(CORE.STBIT1O-=D,RESET_-=CD,CP-=CP);
    M___1(M___1.Q-=Q) = FD2A(CORE.STBIT3O-=D,RESET_-=CD,CP-=CP);
    CORE(CORE.CLRYAU-=CLRYAU,CORE.ENYAU-=ENYAU,CORE.HLT-=HLT,
            CORE.STF-=STF,CORE.STBIT3O-=STBIT3O,CORE.STBIT2O-=STBIT2O,
            CORE.STBIT1O-=STBIT1O,CORE.STBIT0O-=STBIT0O) =
            CNVSEQV1CR(EOC-=EOC,EOR-=EOR,SNGL_CYC-=SNGL_CYC,
            SNGL_FRM-=SNGL_FRM,SNGL_LIN-=SNGL_LIN,STOP-=STOP,
            STRT-=STRT,M___4.Q-=STBIT0I,M___3.Q-=STBIT1I,M___2.Q-=STBIT2I,
            M___1.Q-=STBIT3I);


  /* extractors ******************************/


  /* type converters *********************/

ANNOTATIONS
{
```

```
  BUS BUS_TYPE = "DOT";
}

END MODULE;


/* * * * * * *  Contents of NET file YSEQV4FN.NET  * * * * * * */

/*****************************************************/
/*  Netlist copyright (C) 1989 LSI Logic Corporation  */
/*****************************************************/


MODULE YSEQV4FN;

INPUTS      CO,CP,EOR,INC,RESET_,STRT_FLG;
OUTPUTS     CI,FR,IR,LD_,LR,LR_1,SR;

LEVEL FUNCTION;
DEFINE
  /* implicit connectors *******************/

    EOR- = (EOR);
    CO- = (CO);
    SR- = (SR);
    IR- = (IR);
    LD_- = (LD_);
    LR_1- = (LR_1);
    CI- = (CI);
    LR- = (LR);
    FR- = (FR);
    CP- = (CP);
    RESET_- = (RESET_);
    STRT_FLG- = (STRT_FLG);
    INC- = (INC);

  /* part instances ***************************/

    U3(LD_-=Q) = FD4A(CORE.LD_-=D,CP-=CP,RESET_-=SD);
    M___2(M___2.Q-=Q) = FD2A(RESET_-=CD,CP-=CP,CORE.STBIT2O-=D);
    U1(LR_1-=Q) = FD2A(CP-=CP,RESET_-=CD,CORE.LR_1-=D);
    M___4(M___4.Q-=Q) = FD2A(RESET_-=CD,CP-=CP,CORE.STBIT0O-=D);
    M___3(M___3.Q-=Q) = FD2A(RESET_-=CD,CP-=CP,CORE.STBIT1O-=D);
    U6(CI-=Q) = FD2A(CP-=CP,RESET_-=CD,CORE.CI-=D);
    U2(LR-=Q) = FD2A(CP-=CP,RESET_-=CD,CORE.LR-=D);
    U5(FR-=Q) = FD2A(CP-=CP,RESET_-=CD,CORE.FR-=D);
    U4(IR-=Q) = FD2A(CP-=CP,RESET_-=CD,CORE.IR-=D);
    U0(SR-=Q) = FD2A(CP-=CP,RESET_-=CD,CORE.SR-=D);
    CORE(CORE.STBIT2O-=STBIT2O,CORE.STBIT1O-=STBIT1O,CORE.STBIT0O-=STBIT0O,
            CORE.CI-=CI,CORE.FR-=FR,CORE.IR-=IR,CORE.LD_-=LD_,
            CORE.LR-=LR,CORE.LR_1-=LR_1,CORE.SR-=SR) = YSEQV4CR(
            EOR-=EOR,CO-=CO,M___4.Q-=STBIT0I,M___3.Q-=STBIT1I,
            M___2.Q-=STBIT2I,INC-=INC,STRT_FLG-=STRT_FLG);


  /* extractors ******************************/


  /* type converters *********************/

ANNOTATIONS
{
  BUS BUS_TYPE = "DOT";

  PART_INSTANCES
  {
    CORE LEVEL = "PRIM";
  }
}

END MODULE;
```

```
/* * * * * * *  Contents of NET file CNVDLY.NET  * * * * * * */

/*****************************************************/
/*  Netlist copyright (C) 1989 LSI Logic Corporation  */
/*****************************************************/


MODULE CNVDLY;

INPUTS      CP,D,DLY_POL,NOS.1,NOS.0,RESET_,WAIT;
OUTPUTS     CMAGEN,CNVEN;

LEVEL FUNCTION;
DEFINE
  /* implicit connectors *******************/

    WAIT- = (WAIT);
    RESET_- = (RESET_);
    CP- = (CP);
    CMAGEN- = (CMAGEN);
    CNVEN- = (CNVEN);
    NOS-.1 = (NOS.1);
    NOS-.0 = (NOS.0);
    DLY_POL- = (DLY_POL);
    D- = (D);


  /* part instances **************************/

    U2(U2.Z-=Z) = B3A(WAIT-=A);
    U1.24(U1.Q-.24=Q) = FD2SA(U2.Z-=TE,RESET_-=CD,CP-=CP,U1.Q-.24=TI,
            U1.D-.24=D);
    U1.23(U1.Q-.23=Q) = FD2SA(U2.Z-=TE,RESET_-=CD,CP-=CP,U1.Q-.23=TI,
            U1.D-.23=D);
    U1.22(U1.Q-.22=Q) = FD2SA(U2.Z-=TE,RESET_-=CD,CP-=CP,U1.Q-.22=TI,
            U1.D-.22=D);
    U1.21(U1.Q-.21=Q) = FD2SA(U2.Z-=TE,RESET_-=CD,CP-=CP,U1.Q-.21=TI,
            U1.D-.21=D);
    U1.20(U1.Q-.20=Q) = FD2SA(U2.Z-=TE,RESET_-=CD,CP-=CP,U1.Q-.20=TI,
            U1.D-.20=D);
    U1.19(U1.Q-.19=Q) = FD2SA(U2.Z-=TE,RESET_-=CD,CP-=CP,U1.Q-.19=TI,
            U1.D-.19=D);
    U1.18(U1.Q-.18=Q) = FD2SA(U2.Z-=TE,RESET_-=CD,CP-=CP,U1.Q-.18=TI,
            U1.D-.18=D);
    U1.17(U1.Q-.17=Q) = FD2SA(U2.Z-=TE,RESET_-=CD,CP-=CP,U1.Q-.17=TI,
            U1.D-.17=D);
    U1.16(U1.Q-.16=Q) = FD2SA(U2.Z-=TE,RESET_-=CD,CP-=CP,U1.Q-.16=TI,
            U1.D-.16=D);
    U1.15(U1.Q-.15=Q) = FD2SA(U2.Z-=TE,RESET_-=CD,CP-=CP,U1.Q-.15=TI,
            U1.D-.15=D);
    U1.14(U1.Q-.14=Q) = FD2SA(U2.Z-=TE,RESET_-=CD,CP-=CP,U1.Q-.14=TI,
            U1.D-.14=D);
    U1.13(U1.Q-.13=Q) = FD2SA(U2.Z-=TE,RESET_-=CD,CP-=CP,U1.Q-.13=TI,
            U1.D-.13=D);
    U1.12(U1.Q-.12=Q) = FD2SA(U2.Z-=TE,RESET_-=CD,CP-=CP,U1.Q-.12=TI,
            U1.D-.12=D);
    U1.11(U1.Q-.11=Q) = FD2SA(U2.Z-=TE,RESET_-=CD,CP-=CP,U1.Q-.11=TI,
            U1.D-.11=D);
    U1.10(U1.Q-.10=Q) = FD2SA(U2.Z-=TE,RESET_-=CD,CP-=CP,U1.Q-.10=TI,
            U1.D-.10=D);
    U1.9(U1.Q-.9=Q) = FD2SA(U2.Z-=TE,RESET_-=CD,CP-=CP,U1.Q-.9=TI,
            U1.D-.9=D);
    U1.8(U1.Q-.8=Q) = FD2SA(U2.Z-=TE,RESET_-=CD,CP-=CP,U1.Q-.8=TI,
            U1.D-.8=D);
    U1.7(U1.Q-.7=Q) = FD2SA(U2.Z-=TE,RESET_-=CD,CP-=CP,U1.Q-.7=TI,
            U1.D-.7=D);
    U1.6(U1.Q-.6=Q) = FD2SA(U2.Z-=TE,RESET_-=CD,CP-=CP,U1.Q-.6=TI,
            U1.D-.6=D);
    U1.5(U1.Q-.5=Q) = FD2SA(U2.Z-=TE,RESET_-=CD,CP-=CP,U1.Q-.5=TI,
            U1.D-.5=D);
    U1.4(U1.Q-.4=Q) = FD2SA(U2.Z-=TE,RESET_-=CD,CP-=CP,U1.Q-.4=TI,
            U1.D-.4=D);
    U1.3(U1.Q-.3=Q) = FD2SA(U2.Z-=TE,RESET_-=CD,CP-=CP,U1.Q-.3=TI,
            U1.D-.3=D);
```

```
U1.2(U1.Q-.2=Q) = FD2SA(U2.Z-=TE,RESET_-=CD,CP-=CP,U1.Q-.2=TI,
        U1.D-.2=D);
U1.1(U1.Q-.1=Q) = FD2SA(U2.Z-=TE,RESET_-=CD,CP-=CP,U1.Q-.1=TI,
        U1.D-.1=D);
U1.0(U1.Q-.0=Q) = FD2SA(U2.Z-=TE,RESET_-=CD,CP-=CP,U1.Q-.0=TI,
        U1.D-.0=D);
U0(CNVEN-=Z) = MUX81HB(U0.D1-=D1,U0.D2-=D2,U0.D3-=D3,U0.D4-=D4,
        U0.D5-=D5,U0.D6-=D6,U0.D7-=D7,U0.B-=B,U0.C-=C,
        DLY_POL-=A,U0.D0-=D0);


/* extractors ******************************/

 U1.Q-.3 = (CMAGEN-);
 U1.Q-.9 = (U0.D1-);
 U1.Q-.12 = (U0.D2-);
 U1.Q-.14 = (U0.D3-);
 U1.Q-.19 = (U0.D5-);
 U1.Q-.20 = (U0.D6-);
 U1.Q-.24 = (U0.D7-);
 NOS-.0 = (U0.B-);
 NOS-.1 = (U0.C-);
 U1.Q-.8 = (U0.D0-);
 U1.Q-.16 = (U0.D4-);
 U1.Q-.23 = (M-0.23);
 U1.Q-.22 = (M-0.22);
 U1.Q-.21 = (M-0.21);
 U1.Q-.20 = (M-0.20);
 U1.Q-.19 = (M-0.19);
 U1.Q-.18 = (M-0.18);
 U1.Q-.17 = (M-0.17);
 U1.Q-.16 = (M-0.16);
 U1.Q-.15 = (M-0.15);
 U1.Q-.14 = (M-0.14);
 U1.Q-.13 = (M-0.13);
 U1.Q-.12 = (M-0.12);
 U1.Q-.11 = (M-0.11);
 U1.Q-.10 = (M-0.10);
 U1.Q-.9 = (M-0.9);
 U1.Q-.8 = (M-0.8);
 U1.Q-.7 = (M-0.7);
 U1.Q-.6 = (M-0.6);
 U1.Q-.5 = (M-0.5);
 U1.Q-.4 = (M-0.4);
 U1.Q-.3 = (M-0.3);
 U1.Q-.2 = (M-0.2);
 U1.Q-.1 = (M-0.1);
 U1.Q-.0 = (M-0.0);
 U1.D-.24 = (M-0.23);
 U1.D-.23 = (M-0.22);
 U1.D-.22 = (M-0.21);
 U1.D-.21 = (M-0.20);
 U1.D-.20 = (M-0.19);
 U1.D-.19 = (M-0.18);
 U1.D-.18 = (M-0.17);
 U1.D-.17 = (M-0.16);
 U1.D-.16 = (M-0.15);
 U1.D-.15 = (M-0.14);
 U1.D-.14 = (M-0.13);
 U1.D-.13 = (M-0.12);
 U1.D-.12 = (M-0.11);
 U1.D-.11 = (M-0.10);
 U1.D-.10 = (M-0.9);
 U1.D-.9 = (M-0.8);
 U1.D-.8 = (M-0.7);
 U1.D-.7 = (M-0.6);
 U1.D-.6 = (M-0.5);
 U1.D-.5 = (M-0.4);
 U1.D-.4 = (M-0.3);
 U1.D-.3 = (M-0.2);
 U1.D-.2 = (M-0.1);
 U1.D-.1 = (M-0.0);
 U1.D-.0 = (D-);
```

```
  /* type converters *********************/

ANNOTATIONS
{
  BUS BUS_TYPE = "DOT";
}

END MODULE;


/* * * * * * *  Contents of NET file CNTD8_DEC8.NET  * * * * * * */

/*****************************************************/
/*  Netlist copyright (C) 1989 LSI Logic Corporation  */
/*****************************************************/


MODULE CNTD8_DEC8;

INPUTS      A.7,A.6,A.5,A.4,A.3,A.2,A.1,A.0,CIN1,CIN2,CIN3;
OUTPUTS     CON,Y.7,Y.6,Y.5,Y.4,Y.3,Y.2,Y.1,Y.0;

LEVEL FUNCTION;
DEFINE
  /* implicit connectors *******************/

    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    CIN2- = (CIN2);
    CIN3- = (CIN3);
    CIN1- = (CIN1);
    CON- = (CON);
    Y-.7 = (Y.7);
    Y-.6 = (Y.6);
    Y-.5 = (Y.5);
    Y-.4 = (Y.4);
    Y-.3 = (Y.3);
    Y-.2 = (Y.2);
    Y-.1 = (Y.1);
    Y-.0 = (Y.0);


  /* part instances **************************/

    M___13(M___13.Z-=Z) = ENC(M___8.Z-=A,M___13.B-=B);
    M___4(M___4.Z-=Z) = N1B(M___4.A-=A);
    U11(U11.Z-=Z) = EOC(M___1.Z-=A,U11.B-=B);
    U14(U14.Z-=Z) = N1C(M___5.B-=A);
    U0(U0.Z-=Z) = N1C(U6.Z-=A);
    U6(U6.Z-=Z) = OR3C(CIN2-=B,CIN3-=C,CIN1-=A);
    M___5(M___5.Z-=Z) = NR2C(M___5.B-=B,U6.Z-=A);
    M___3(M___3.Z-=Z) = N1C(M___3.A-=A);
    U1(U1.Z-=Z) = N1C(U1.A-=A);
    M___11(M___11.Z-=Z) = ENC(M___6.Z-=A,M___11.B-=B);
    M___6(M___6.Z-=Z) = ND2C(U1.Z-=B,U0.Z-=A);
    M___9(M___9.Z-=Z) = ND4C(M___5.Z-=D,M___4.Z-=C,M___3.Z-=B,U1.Z-=A);
    M___1(M___1.Z-=Z) = N1C(M___9.Z-=A);
    U4(U4.Z-=Z) = N1C(U4.A-=A);
    U3(U3.Z-=Z) = N1C(U3.A-=A);
    U7(U7.Z-=Z) = ND3C(U3.Z-=C,U2.Z-=B,M___1.Z-=A);
    U2(U2.Z-=Z) = N1C(U2.A-=A);
    U13(U13.Z-=Z) = ENC(U8.Z-=A,U13.B-=B);
    U8(U8.Z-=Z) = ND4C(U3.Z-=C,U4.Z-=D,U2.Z-=B,M___1.Z-=A);
    U5(U5.Z-=Z) = ND2C(U2.Z-=B,M___1.Z-=A);
    U10(U10.Z-=Z) = ENC(U5.Z-=A,U10.B-=B);
    U12(U12.Z-=Z) = ENC(U7.Z-=A,U12.B-=B);
    U15(U15.Z-=Z) = N1C(U15.A-=A);
```

```
  U9(CON-=Z) = ND8B(M___4.Z-=G,M___3.Z-=F,U14.Z-=H,U1.Z-=E,U4.Z-=C,
        U3.Z-=D,U2.Z-=B,U15.Z-=A);
  M___8(M___8.Z-=Z) = ND4C(U0.Z-=A,U1.Z-=B,M___3.Z-=C,M___4.Z-=D);
  M___7(M___7.Z-=Z) = ND3C(M___3.Z-=C,U1.Z-=B,U0.Z-=A);
  M___12(M___12.Z-=Z) = ENC(M___7.Z-=A,M___12.B-=B);
  M___10(M___10.Z-=Z) = EOC(U0.Z-=A,M___10.B-=B);


 /* extractors ******************************/

  M-3.3 = (M___13.Z-);
  M-2.3 = (M___13.B-);
  M-2.2 = (M___4.A-);
  A-.3 = (M-2.3);
  A-.2 = (M-2.2);
  A-.1 = (M-2.1);
  A-.0 = (M-2.0);
  A-.7 = (M-1.3);
  A-.6 = (M-1.2);
  A-.5 = (M-1.1);
  A-.4 = (M-1.0);
  Y-.7 = (M-0.3);
  Y-.6 = (M-0.2);
  Y-.5 = (M-0.1);
  Y-.4 = (M-0.0);
  M-0.0 = (U11.Z-);
  M-1.0 = (U11.B-);
  M-2.3 = (M___5.B-);
  M-2.1 = (M___3.A-);
  M-2.0 = (U1.A-);
  M-3.1 = (M___11.Z-);
  M-2.1 = (M___11.B-);
  M-1.2 = (U4.A-);
  M-1.1 = (U3.A-);
  M-1.0 = (U2.A-);
  M-0.3 = (U13.Z-);
  M-1.3 = (U13.B-);
  M-1.1 = (U10.B-);
  M-0.1 = (U10.Z-);
  M-0.2 = (U12.Z-);
  M-1.2 = (U12.B-);
  M-1.3 = (U15.A-);
  M-3.2 = (M___12.Z-);
  M-2.2 = (M___12.B-);
  M-2.0 = (M___10.B-);
  M-3.0 = (M___10.Z-);
  Y-.3 = (M-3.3);
  Y-.2 = (M-3.2);
  Y-.1 = (M-3.1);
  Y-.0 = (M-3.0);


 /* type converters *********************/

ANNOTATIONS
{
  BUS BUS_TYPE = "DOT";
}

END MODULE;

/* * * * * * *  Contents of NET file Y_CNTV3.NET  * * * * * * */

/*******************************************************/
/*  Netlist copyright (C) 1989 LSI Logic Corporation  */
/*******************************************************/


MODULE Y_CNTV3;

INPUTS        CP,CS_,EOR,INC,PDI.15,PDI.14,PDI.13,PDI.12,PDI.11,
              PDI.10,PDI.9,PDI.8,PDI.7,PDI.6,PDI.5,PDI.4,PDI.3,
              PDI.2,PDI.1,PDI.0,RESET_,STRT_FLG,WR_;
OUTPUTS       FIRST_ROW,INROW,LAST,LSTMINUS1,SECOND_ROW;
```

```
LEVEL FUNCTION;
DEFINE
  /* implicit connectors ********************/

    EOR- = (EOR);
    FIRST_ROW- = (FIRST_ROW);
    SECOND_ROW- = (SECOND_ROW);
    LSTMINUS1- = (LSTMINUS1);
    INROW- = (INROW);
    INC- = (INC);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    STRT_FLG- = (STRT_FLG);
    WR_- = (WR_);
    CS_- = (CS_);
    CP- = (CP);
    RESET_- = (RESET_);
    LAST- = (LAST);


  /* part instances **************************/

    U10(U10.Z-=Z) = OR3B(STRT_FLG-=A,WR_-=B,CS_-=C);
    U2(U2.CO-=CO) = CNT16D(U7.Q-.15=DI.15,U7.Q-.14=DI.14,U7.Q-.13=DI.13,
            U7.Q-.12=DI.12,U7.Q-.11=DI.11,U7.Q-.10=DI.10,U7.Q-.9=DI.9,
            U7.Q-.8=DI.8,U7.Q-.7=DI.7,U7.Q-.6=DI.6,U7.Q-.5=DI.5,
            U7.Q-.4=DI.4,U7.Q-.3=DI.3,U7.Q-.2=DI.2,U7.Q-.1=DI.1,
            U7.Q-.0=DI.0,U4.CI-=CI,CP-=CP,U4.LD_-=LD_,U1.Z-=RESET_);
    U7.15(U7.Q-.15=Q) = FD2A(PDI-.15=D,U10.Z-=CP,U0.Z-=CD);
    U7.14(U7.Q-.14=Q) = FD2A(PDI-.14=D,U10.Z-=CP,U0.Z-=CD);
    U7.13(U7.Q-.13=Q) = FD2A(PDI-.13=D,U10.Z-=CP,U0.Z-=CD);
    U7.12(U7.Q-.12=Q) = FD2A(PDI-.12=D,U10.Z-=CP,U0.Z-=CD);
    U7.11(U7.Q-.11=Q) = FD2A(PDI-.11=D,U10.Z-=CP,U0.Z-=CD);
    U7.10(U7.Q-.10=Q) = FD2A(PDI-.10=D,U10.Z-=CP,U0.Z-=CD);
    U7.9(U7.Q-.9=Q) = FD2A(PDI-.9=D,U10.Z-=CP,U0.Z-=CD);
    U7.8(U7.Q-.8=Q) = FD2A(PDI-.8=D,U10.Z-=CP,U0.Z-=CD);
    U7.7(U7.Q-.7=Q) = FD2A(PDI-.7=D,U10.Z-=CP,U0.Z-=CD);
    U7.6(U7.Q-.6=Q) = FD2A(PDI-.6=D,U10.Z-=CP,U0.Z-=CD);
    U7.5(U7.Q-.5=Q) = FD2A(PDI-.5=D,U10.Z-=CP,U0.Z-=CD);
    U7.4(U7.Q-.4=Q) = FD2A(PDI-.4=D,U10.Z-=CP,U0.Z-=CD);
    U7.3(U7.Q-.3=Q) = FD2A(PDI-.3=D,U10.Z-=CP,U0.Z-=CD);
    U7.2(U7.Q-.2=Q) = FD2A(PDI-.2=D,U10.Z-=CP,U0.Z-=CD);
    U7.1(U7.Q-.1=Q) = FD2A(PDI-.1=D,U10.Z-=CP,U0.Z-=CD);
    U7.0(U7.Q-.0=Q) = FD2A(PDI-.0=D,U10.Z-=CP,U0.Z-=CD);
    U6(U6.Z-=Z) = N1A(RESET_-=A);
    U0(U0.Z-=Z) = N1A(U6.Z-=A);
    U1(U1.Z-=Z) = AND2C(U10.Z-=A,U0.Z-=B);
    U4(U4.CI-=CI,U4.LD_-=LD_,FIRST_ROW-=FR,SECOND_ROW-=SR,
            LSTMINUS1-=LR_1,LAST-=LR,INROW-=IR) = YSEQV4FN(EOR-=EOR,
            STRT_FLG-=STRT_FLG,CP-=CP,U2.CO-=CO,INC-=INC,U1.Z-=RESET_);


  /* extractors ******************************/



  /* type converters *********************/

ANNOTATIONS
{
```

```
  BUS BUS_TYPE = "DOT";
}

END MODULE;


/* * * * * * *  Contents of NET file CNTD8.NET  * * * * * * * */

/*****************************************************/
/*  Netlist copyright (C) 1989 LSI Logic Corporation  */
/*****************************************************/


MODULE CNTD8;

INPUTS      AL,CD,CIN1,CIN2,CIN3,CP0,D.7,D.6,D.5,D.4,D.3,D.2,D.1,
            D.0;
OUTPUTS     CO,Q.7,Q.6,Q.5,Q.4,Q.3,Q.2,Q.1,Q.0;

LEVEL FUNCTION;
DEFINE
  /* implicit connectors *******************/

    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    CIN1- = (CIN1);
    CIN3- = (CIN3);
    CIN2- = (CIN2);
    CO- = (CO);
    CD- = (CD);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    AL- = (AL);
    CP0- = (CP0);


  /* part instances **************************/

    M___36(M___36.Z-=Z) = N1C(M___36.A-=A);
    M___38(M___38.Z-=Z) = N1C(M___38.A-=A);
    M___16(M___16.Z-=Z) = ND2C(M___16.B-=B,U1.Z-=A);
    M___14(M___14.Z-=Z) = ND2C(M___14.B-=B,U1.Z-=A);
    U0(CO-=Z) = N1B(M___9.CON-=A);
    M___9(M___9.CON-=CON,M___9.Y-.7=Y.7,M___9.Y-.6=Y.6,M___9.Y-.5=Y.5,
            M___9.Y-.4=Y.4,M___9.Y-.3=Y.3,M___9.Y-.2=Y.2,
            M___9.Y-.1=Y.1,M___9.Y-.0=Y.0) = CNTD8_DEC8(CIN1-=CIN1,
            CIN3-=CIN3,CIN2-=CIN2,M___9.A-.7=A.7,M___9.A-.6=A.6,
            M___9.A-.5=A.5,M___9.A-.4=A.4,M___9.A-.3=A.3,
            M___9.A-.2=A.2,M___9.A-.1=A.1,M___9.A-.0=A.0);
    M___17(M___17.Z-=Z) = ND2C(M___17.B-=B,U1.Z-=A);
    M___41(M___41.Z-=Z) = N1C(M___41.A-=A);
    M___25(M___25.Z-=Z) = ND2C(M___41.Z-=B,U1.Z-=A);
    M___33(M___33.Z-=Z) = AND2C(CD-=A,M___25.Z-=B);
    U6(U6.Z-=Z) = N1B(M___7.QN-=A);
    M___7(M___7.Q-=Q,M___7.QN-=QN) = FD3A(M___7.D-=D,M___17.Z-=SD,
            M___33.Z-=CD,U2.Z-=CP);
    M___15(M___15.Z-=Z) = ND2C(M___15.B-=B,U1.Z-=A);
    M___39(M___39.Z-=Z) = N1C(M___39.A-=A);
    M___23(M___23.Z-=Z) = ND2C(M___39.Z-=B,U1.Z-=A);
    M___31(M___31.Z-=Z) = AND2C(CD-=A,M___23.Z-=B);
    U8(U8.Z-=Z) = N1B(M___5.QN-=A);
```

```
 M___5(M___5.Q-=Q,M___5.QN-=QN) = FD3A(M___5.D-=D,M___15.Z-=SD,
        M___31.Z-=CD,U2.Z-=CP);
 M___18(M___18.Z-=Z) = ND2C(M___18.B-=B,U1.Z-=A);
 M___42(M___42.Z-=Z) = N1C(M___42.A-=A);
 M___26(M___26.Z-=Z) = ND2C(M___42.Z-=B,U1.Z-=A);
 M___34(M___34.Z-=Z) = AND2C(CD-=A,M___26.Z-=B);
 U5(U5.Z-=Z) = N1B(M___8.QN-=A);
 M___8(M___8.Q-=Q,M___8.QN-=QN) = FD3A(M___8.D-=D,M___18.Z-=SD,
        M___34.Z-=CD,U2.Z-=CP);
 M___13(M___13.Z-=Z) = ND2C(M___13.B-=B,U1.Z-=A);
 U10(U10.Z-=Z) = N1B(M___3.QN-=A);
 M___3(M___3.Q-=Q,M___3.QN-=QN) = FD3A(M___3.D-=D,M___13.Z-=SD,
        M___29.Z-=CD,U2.Z-=CP);
 M___37(M___37.Z-=Z) = N1C(M___37.A-=A);
 M___21(M___21.Z-=Z) = ND2C(M___37.Z-=B,U1.Z-=A);
 M___29(M___29.Z-=Z) = AND2C(CD-=A,M___21.Z-=B);
 M___40(M___40.Z-=Z) = N1C(M___40.A-=A);
 M___24(M___24.Z-=Z) = ND2C(M___40.Z-=B,U1.Z-=A);
 M___32(M___32.Z-=Z) = AND2C(CD-=A,M___24.Z-=B);
 M___35(M___35.Z-=Z) = N1C(M___35.A-=A);
 M___19(M___19.Z-=Z) = ND2C(M___35.Z-=B,U1.Z-=A);
 M___27(M___27.Z-=Z) = AND2C(CD-=A,M___19.Z-=B);
 U12(U12.Z-=Z) = N1B(M___1.QN-=A);
 M___1(M___1.Q-=Q,M___1.QN-=QN) = FD3A(M___11.Z-=SD,M___1.D-=D,
        M___27.Z-=CD,U2.Z-=CP);
 M___11(M___11.Z-=Z) = ND2C(M___11.B-=B,U1.Z-=A);
 M___12(M___12.Z-=Z) = ND2C(M___12.B-=B,U1.Z-=A);
 U11(U11.Z-=Z) = N1B(M___2.QN-=A);
 M___2(M___2.Q-=Q,M___2.QN-=QN) = FD3A(M___2.D-=D,M___12.Z-=SD,
        M___28.Z-=CD,U2.Z-=CP);
 M___28(M___28.Z-=Z) = AND2C(CD-=A,M___20.Z-=B);
 M___20(M___20.Z-=Z) = ND2C(M___36.Z-=B,U1.Z-=A);
 U1(U1.Z-=Z) = N1C(AL-=A);
 M___22(M___22.Z-=Z) = ND2C(M___38.Z-=B,U1.Z-=A);
 M___30(M___30.Z-=Z) = AND2C(CD-=A,M___22.Z-=B);
 M___4(M___4.Q-=Q,M___4.QN-=QN) = FD3A(M___4.D-=D,M___14.Z-=SD,
        M___30.Z-=CD,U2.Z-=CP);
 U9(U9.Z-=Z) = N1B(M___4.QN-=A);
 U7(U7.Z-=Z) = N1B(M___6.QN-=A);
 M___6(M___6.Q-=Q,M___6.QN-=QN) = FD3A(M___6.D-=D,M___16.Z-=SD,
        M___32.Z-=CD,U2.Z-=CP);
 U2(U2.Z-=Z) = N1E(U3.Z-=A);
 U3(U3.Z-=Z) = N1C(CP0-=A);


/* extractors ******************************/

 D-.1 = (M___36.A-);
 D-.3 = (M___38.A-);
 D-.5 = (M___16.B-);
 D-.3 = (M___14.B-);
 M___9.Y-.0 = (M___1.D-);
 M___9.Y-.1 = (M___2.D-);
 M___9.Y-.3 = (M___4.D-);
 M___9.A-.1 = (M___2.Q-);
 M___9.A-.0 = (M___1.Q-);
 M___9.Y-.6 = (M___7.D-);
 D-.6 = (M___17.B-);
 D-.6 = (M___41.A-);
 Q-.6 = (U6.Z-);
 M___9.A-.6 = (M___7.Q-);
 M___9.A-.3 = (M___4.Q-);
 M___9.A-.5 = (M___6.Q-);
 M___9.A-.2 = (M___3.Q-);
 M___9.Y-.4 = (M___5.D-);
 D-.4 = (M___15.B-);
 D-.4 = (M___39.A-);
 Q-.4 = (U8.Z-);
 M___9.A-.4 = (M___5.Q-);
 M___9.A-.7 = (M___8.Q-);
 D-.7 = (M___18.B-);
 D-.7 = (M___42.A-);
 Q-.7 = (U5.Z-);
 M___9.Y-.7 = (M___8.D-);
```

```
    M___9.Y-.5 = (M___6.D-);
    M___9.Y-.2 = (M___3.D-);
    D-.2 = (M___13.B-);
    Q-.2 = (U10.Z-);
    D-.2 = (M___37.A-);
    D-.5 = (M___40.A-);
    D-.0 = (M___35.A-);
    Q-.0 = (U12.Z-);
    D-.0 = (M___11.B-);
    D-.1 = (M___12.B-);
    Q-.1 = (U11.Z-);
    Q-.3 = (U9.Z-);
    Q-.5 = (U7.Z-);


  /* type converters *********************/

ANNOTATIONS

{
  BUS BUS_TYPE = "DOT";
}

END MODULE;



/* * * * * * *  Contents of NET file CNT16D.NET  * * * * * * */

/*******************************************************/
/*  Netlist copyright (C) 1989 LSI Logic Corporation  */
/*******************************************************/


MODULE CNT16D;

INPUTS      CI,CP,DI.15,DI.14,DI.13,DI.12,DI.11,DI.10,DI.9,DI.8,
            DI.7,DI.6,DI.5,DI.4,DI.3,DI.2,DI.1,DI.0,LD_,RESET_;
OUTPUTS     CO,Q.15,Q.14,Q.13,Q.12,Q.11,Q.10,Q.9,Q.8,Q.7,Q.6,Q.5,
            Q.4,Q.3,Q.2,Q.1,Q.0;

LEVEL FUNCTION;
DEFINE
  /* implicit connectors *******************/

    CO- = (CO);
    CP- = (CP);
    Q-.15 = (Q.15);
    Q-.14 = (Q.14);
    Q-.13 = (Q.13);
    Q-.12 = (Q.12);
    Q-.11 = (Q.11);
    Q-.10 = (Q.10);
    Q-.9 = (Q.9);
    Q-.8 = (Q.8);
    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    LD_- = (LD_);
    DI-.15 = (DI.15);
    DI-.14 = (DI.14);
    DI-.13 = (DI.13);
    DI-.12 = (DI.12);
    DI-.11 = (DI.11);
    DI-.10 = (DI.10);
    DI-.9 = (DI.9);
    DI-.8 = (DI.8);
    DI-.7 = (DI.7);
    DI-.6 = (DI.6);
    DI-.5 = (DI.5);
```

```
    DI-.4 = (DI.4);
    DI-.3 = (DI.3);
    DI-.2 = (DI.2);
    DI-.1 = (DI.1);
    DI-.0 = (DI.0);
    CI- = (CI);
    CI- = (CI);
    BRESET_- = (BRESET_);
    BRESET_- = (BRESET_);
    RESET_- = (RESET_);


  /* part instances ***************************/

    U0(U0.Q-.7=Q.7,U0.Q-.6=Q.6,U0.Q-.5=Q.5,U0.Q-.4=Q.4,U0.Q-.3=Q.3,
            U0.Q-.2=Q.2,U0.Q-.1=Q.1,U0.Q-.0=Q.0,U0.CO-=CO) = CNTD8(
            CP-=CP0,U2.Z-=CIN2,U2.Z-=CIN3,BRESET_-=CD,LD_-=AL,
            U0.D-.7=D.7,U0.D-.6=D.6,U0.D-.5=D.5,U0.D-.4=D.4,
            U0.D-.3=D.3,U0.D-.2=D.2,U0.D-.1=D.1,U0.D-.0=D.0,U2.Z-=CIN1);
    U4(CO-=Z) = AND3B(U1.CO-=B,CI-=C,U0.CO-=A);
    U7(U7.Z-=Z) = N1B(CI-=A);
    U2(U2.Z-=Z) = ND2B(U1.CO-=A,CI-=B);
    U1(U1.Q-.7=Q.7,U1.Q-.6=Q.6,U1.Q-.5=Q.5,U1.Q-.4=Q.4,U1.Q-.3=Q.3,
            U1.Q-.2=Q.2,U1.Q-.1=Q.1,U1.Q-.0=Q.0,U1.CO-=CO) = CNTD8(
            CP-=CP0,U7.Z-=CIN2,U7.Z-=CIN3,U7.Z-=CIN1,LD_-=AL,
            BRESET_-=CD,U1.D-.7=D.7,U1.D-.6=D.6,U1.D-.5=D.5,
            U1.D-.4=D.4,U1.D-.3=D.3,U1.D-.2=D.2,U1.D-.1=D.1,
            U1.D-.0=D.0);
    U5(BRESET_-=Z) = N1C(U6.Z-=A);
    U6(U6.Z-=Z) = N1A(RESET_-=A);


  /* extractors ******************************/

    Q-.7 = (U1.Q-.7);
    Q-.6 = (U1.Q-.6);
    Q-.5 = (U1.Q-.5);
    Q-.4 = (U1.Q-.4);
    Q-.3 = (U1.Q-.3);
    Q-.2 = (U1.Q-.2);
    Q-.1 = (U1.Q-.1);
    Q-.0 = (U1.Q-.0);
    Q-.15 = (U0.Q-.7);
    Q-.14 = (U0.Q-.6);
    Q-.13 = (U0.Q-.5);
    Q-.12 = (U0.Q-.4);
    Q-.11 = (U0.Q-.3);
    Q-.10 = (U0.Q-.2);
    Q-.9 = (U0.Q-.1);
    Q-.8 = (U0.Q-.0);
    DI-.7 = (U1.D-.7);
    DI-.6 = (U1.D-.6);
    DI-.5 = (U1.D-.5);
    DI-.4 = (U1.D-.4);
    DI-.3 = (U1.D-.3);
    DI-.2 = (U1.D-.2);
    DI-.1 = (U1.D-.1);
    DI-.0 = (U1.D-.0);
    DI-.15 = (U0.D-.7);
    DI-.14 = (U0.D-.6);
    DI-.13 = (U0.D-.5);
    DI-.12 = (U0.D-.4);
    DI-.11 = (U0.D-.3);
    DI-.10 = (U0.D-.2);
    DI-.9 = (U0.D-.1);
    DI-.8 = (U0.D-.0);


  /* type converters *********************/

ANNOTATIONS
{
  BUS BUS_TYPE = "DOT";
}
```

```
END MODULE;


/* * * * * * *  Contents of NET file RSTDECV1.NET  * * * * * * */

/*******************************************************/
/*  Netlist copyright (C) 1989 LSI Logic Corporation  */
/*******************************************************/


MODULE RSTDECV1;

INPUTS      DLY_POL,NOS0,NOS1,RESET_;
OUTPUTS     RST0,RST1,RST2,RST3;

LEVEL FUNCTION;
DEFINE
  /* implicit connectors *******************/

    RST2- = (RST2);
    RST3- = (RST3);
    RST1- = (RST1);
    NOS1- = (NOS1);
    RST0- = (RST0);
    DLY_POL- = (DLY_POL);
    RESET_- = (RESET_);
    NOS0- = (NOS0);


  /* part instances **************************/

    M10(RST3-=Z) = N1B(M6.Z-=A);
    M9(RST0-=Z) = ND3B(M6.Z-=C,M4.Z-=A,M5.Z-=B);
    M5(M5.Z-=Z) = ND2B(NOS0-=B,RESET_-=A);
    M6(M6.Z-=Z) = ND2C(DLY_POL-=B,RESET_-=A);
    M4(M4.Z-=Z) = ND2B(NOS1-=B,RESET_-=A);
    M8(RST1-=Z) = ND2B(M6.Z-=B,M4.Z-=A);
    M7(RST2-=Z) = ND2B(M6.Z-=B,M3.Z-=A);
    M3(M3.Z-=Z) = ND3B(NOS0-=C,NOS1-=B,RESET_-=A);


  /* extractors *****************************/


  /* type converters *********************/

ANNOTATIONS
{
  BUS BUS_TYPE = "DOT";
}

END MODULE;


/* * * * * * *  Contents of NET file SEDLYCNT.NET  * * * * * * */

/*******************************************************/
/*  Netlist copyright (C) 1989 LSI Logic Corporation  */

/*******************************************************/


MODULE SEDLYCNT;

INPUTS      DLY_POL,NOS.1,NOS.0,RESET_;
OUTPUTS     RST_.23,RST_.22,RST_.21,RST_.20,RST_.19,RST_.18,
            RST_.17,RST_.16,RST_.15,RST_.14,RST_.13,RST_.12,
            RST_.11,RST_.10,RST_.9,RST_.8,RST_.7,RST_.6,RST_.5,
            RST_.4,RST_.3,RST_.2,RST_.1,RST_.0;

LEVEL FUNCTION;
```

```
DEFINE
  /* implicit connectors *******************/

    RESET_- = (RESET_);
    RST_-.23 = (RST_.23);
    RST_-.22 = (RST_.22);
    RST_-.21 = (RST_.21);
    RST_-.20 = (RST_.20);
    RST_-.19 = (RST_.19);
    RST_-.18 = (RST_.18);
    RST_-.17 = (RST_.17);
    RST_-.16 = (RST_.16);
    RST_-.15 = (RST_.15);
    RST_-.14 = (RST_.14);
    RST_-.13 = (RST_.13);
    RST_-.12 = (RST_.12);
    RST_-.11 = (RST_.11);
    RST_-.10 = (RST_.10);
    RST_-.9 = (RST_.9);
    RST_-.8 = (RST_.8);
    RST_-.7 = (RST_.7);
    RST_-.6 = (RST_.6);
    RST_-.5 = (RST_.5);
    RST_-.4 = (RST_.4);
    RST_-.3 = (RST_.3);
    RST_-.2 = (RST_.2);
    RST_-.1 = (RST_.1);
    RST_-.0 = (RST_.0);
    DLY_POL- = (DLY_POL);
    NOS-.1 = (NOS.1);
    NOS-.0 = (NOS.0);


  /* part instances ***************************/

    U0(U0.RST3-=RST3,U0.RST2-=RST2,U0.RST1-=RST1,U0.RST0-=RST0) =
            RSTDECV1(RESET_-=RESET_,U0.NOS0-=NOS0,U0.NOS1-=NOS1,
            DLY_POL-=DLY_POL);


  /* extractors ******************************/

    RST_-.2 = (RESET_-);
    RST_-.12 = (RESET_-);
    RST_-.5 = (U0.RST0-);
    RST_-.3 = (RESET_-);
    RST_-.4 = (RESET_-);
    RST_-.1 = (RESET_-);
    RST_-.0 = (RESET_-);
    RST_-.7 = (RESET_-);
    RST_-.19 = (RESET_-);
    RST_-.13 = (RESET_-);
    RST_-.9 = (RESET_-);
    RST_-.10 = (U0.RST1-);
    RST_-.11 = (U0.RST1-);
    RST_-.8 = (RESET_-);
    RST_-.20 = (U0.RST3-);
    RST_-.23 = (U0.RST3-);
    RST_-.21 = (U0.RST3-);
    RST_-.22 = (U0.RST3-);
    RST_-.6 = (RESET_-);
    RST_-.16 = (U0.RST2-);
    RST_-.17 = (U0.RST2-);
    RST_-.15 = (U0.RST2-);
    RST_-.14 = (RESET_-);
    RST_-.18 = (RESET_-);
    NOS-.0 = (U0.NOS0-);
    NOS-.1 = (U0.NOS1-);


  /* type converters *********************/

ANNOTATIONS
{
```

```
  BUS BUS_TYPE = "DOT";
}

END MODULE;


/* * * * * * *  Contents of NET file DUPDLY.NET  * * * * * * */

/*****************************************************/
/*  Netlist copyright (C) 1989 LSI Logic Corporation  */
/*****************************************************/


MODULE DUPDLY;

INPUTS       CP,D,DLY_POL,NOS.1,NOS.0,RESET_,WAIT;
OUTPUTS      DUP;

LEVEL FUNCTION;
DEFINE
  /* implicit connectors ******************/

    DUP- = (DUP);
    WAIT- = (WAIT);
    D- = (D);
    CP- = (CP);
    RESET_- = (RESET_);
    DLY_POL- = (DLY_POL);
    NOS-.1 = (NOS.1);
    NOS-.0 = (NOS.0);


  /* part instances **************************/

    U2(U2.Z-=Z) = B3A(WAIT-=A);
    U1.23(U1.Q-.23=Q) = FD2SA(U2.Z-=TE,U1.D-.23=D,U1.Q-.23=TI,CP-=CP,
            RESET_-=CD);
    U1.22(U1.Q-.22=Q) = FD2SA(U2.Z-=TE,U1.D-.22=D,U1.Q-.22=TI,CP-=CP,
            RESET_-=CD);
    U1.21(U1.Q-.21=Q) = FD2SA(U2.Z-=TE,U1.D-.21=D,U1.Q-.21=TI,CP-=CP,
            RESET_-=CD);
    U1.20(U1.Q-.20=Q) = FD2SA(U2.Z-=TE,U1.D-.20=D,U1.Q-.20=TI,CP-=CP,
            RESET_-=CD);
    U1.19(U1.Q-.19=Q) = FD2SA(U2.Z-=TE,U1.D-.19=D,U1.Q-.19=TI,CP-=CP,
            RESET_-=CD);
    U1.18(U1.Q-.18=Q) = FD2SA(U2.Z-=TE,U1.D-.18=D,U1.Q-.18=TI,CP-=CP,
            RESET_-=CD);
    U1.17(U1.Q-.17=Q) = FD2SA(U2.Z-=TE,U1.D-.17=D,U1.Q-.17=TI,CP-=CP,
            RESET_-=CD);
    U1.16(U1.Q-.16=Q) = FD2SA(U2.Z-=TE,U1.D-.16=D,U1.Q-.16=TI,CP-=CP,
            RESET_-=CD);
    U1.15(U1.Q-.15=Q) = FD2SA(U2.Z-=TE,U1.D-.15=D,U1.Q-.15=TI,CP-=CP,
            RESET_-=CD);
    U1.14(U1.Q-.14=Q) = FD2SA(U2.Z-=TE,U1.D-.14=D,U1.Q-.14=TI,CP-=CP,
            RESET_-=CD);
    U1.13(U1.Q-.13=Q) = FD2SA(U2.Z-=TE,U1.D-.13=D,U1.Q-.13=TI,CP-=CP,
            RESET_-=CD);
    U1.12(U1.Q-.12=Q) = FD2SA(U2.Z-=TE,U1.D-.12=D,U1.Q-.12=TI,CP-=CP,
            RESET_-=CD);
    U1.11(U1.Q-.11=Q) = FD2SA(U2.Z-=TE,U1.D-.11=D,U1.Q-.11=TI,CP-=CP,
            RESET_-=CD);
    U1.10(U1.Q-.10=Q) = FD2SA(U2.Z-=TE,U1.D-.10=D,U1.Q-.10=TI,CP-=CP,
            RESET_-=CD);
    U1.9(U1.Q-.9=Q) = FD2SA(U2.Z-=TE,U1.D-.9=D,U1.Q-.9=TI,CP-=CP,
            RESET_-=CD);
    U1.8(U1.Q-.8=Q) = FD2SA(U2.Z-=TE,U1.D-.8=D,U1.Q-.8=TI,CP-=CP,
            RESET_-=CD);
    U1.7(U1.Q-.7=Q) = FD2SA(U2.Z-=TE,U1.D-.7=D,U1.Q-.7=TI,CP-=CP,
            RESET_-=CD);
    U1.6(U1.Q-.6=Q) = FD2SA(U2.Z-=TE,U1.D-.6=D,U1.Q-.6=TI,CP-=CP,
            RESET_-=CD);
    U1.5(U1.Q-.5=Q) = FD2SA(U2.Z-=TE,U1.D-.5=D,U1.Q-.5=TI,CP-=CP,
            RESET_-=CD);
```

```
U1.4(U1.Q-.4=Q) = FD2SA(U2.Z-=TE,U1.D-.4=D,U1.Q-.4=TI,CP-=CP,
        RESET_-=CD);
U1.3(U1.Q-.3=Q) = FD2SA(U2.Z-=TE,U1.D-.3=D,U1.Q-.3=TI,CP-=CP,
        RESET_-=CD);
U1.2(U1.Q-.2=Q) = FD2SA(U2.Z-=TE,U1.D-.2=D,U1.Q-.2=TI,CP-=CP,
        RESET_-=CD);
U1.1(U1.Q-.1=Q) = FD2SA(U2.Z-=TE,U1.D-.1=D,U1.Q-.1=TI,CP-=CP,
        RESET_-=CD);
U1.0(U1.Q-.0=Q) = FD2SA(U2.Z-=TE,U1.D-.0=D,U1.Q-.0=TI,CP-=CP,
        RESET_-=CD);
U0(DUP-=Z) = MUX81HB(U0.D0-=D0,U0.D1-=D1,U0.D2-=D2,U0.D3-=D3,
        U0.D4-=D4,U0.D5-=D5,U0.D6-=D6,U0.D7-=D7,U0.B-=B,U0.C-=C,
        DLY_POL-=A);


/* extractors *****************************/

 U1.Q-.14 = (U0.D4-);
 U1.Q-.11 = (U0.D3-);
 U1.Q-.4 = (U0.D0-);
 U1.Q-.5 = (U0.D1-);
 U1.Q-.19 = (U0.D6-);
 U1.Q-.9 = (U0.D2-);
 U1.Q-.17 = (U0.D5-);
 U1.Q-.22 = (M-0.22);
 U1.Q-.21 = (M-0.21);
 U1.Q-.20 = (M-0.20);
 U1.Q-.19 = (M-0.19);
 U1.Q-.18 = (M-0.18);
 U1.Q-.17 = (M-0.17);
 U1.Q-.16 = (M-0.16);
 U1.Q-.15 = (M-0.15);
 U1.Q-.14 = (M-0.14);
 U1.Q-.13 = (M-0.13);
 U1.Q-.12 = (M-0.12);
 U1.Q-.11 = (M-0.11);
 U1.Q-.10 = (M-0.10);
 U1.Q-.9 = (M-0.9);
 U1.Q-.8 = (M-0.8);
 U1.Q-.7 = (M-0.7);
 U1.Q-.6 = (M-0.6);
 U1.Q-.5 = (M-0.5);
 U1.Q-.4 = (M-0.4);
 U1.Q-.3 = (M-0.3);
 U1.Q-.2 = (M-0.2);
 U1.Q-.1 = (M-0.1);
 U1.Q-.0 = (M-0.0);
 U1.D-.23 = (M-0.22);
 U1.D-.22 = (M-0.21);
 U1.D-.21 = (M-0.20);
 U1.D-.20 = (M-0.19);
 U1.D-.19 = (M-0.18);
 U1.D-.18 = (M-0.17);
 U1.D-.17 = (M-0.16);
 U1.D-.16 = (M-0.15);
 U1.D-.15 = (M-0.14);
 U1.D-.14 = (M-0.13);
 U1.D-.13 = (M-0.12);
 U1.D-.12 = (M-0.11);
 U1.D-.11 = (M-0.10);
 U1.D-.10 = (M-0.9);
 U1.D-.9 = (M-0.8);
 U1.D-.8 = (M-0.7);
 U1.D-.7 = (M-0.6);
 U1.D-.6 = (M-0.5);
 U1.D-.5 = (M-0.4);
 U1.D-.4 = (M-0.3);
 U1.D-.3 = (M-0.2);
 U1.D-.2 = (M-0.1);
 U1.D-.1 = (M-0.0);
 U1.D-.0 = (D-);
 U1.Q-.23 = (U0.D7-);
 NOS-.0 = (U0.B-);
 NOS-.1 = (U0.C-);
```

```
/* type converters *********************/

ANNOTATIONS
{
  BUS BUS_TYPE = "DOT";
}

END MODULE;


/* * * * * * *  Contents of NET file SEDLYV1.NET  * * * * * * */

/******************************************************/
/*  Netlist copyright (C) 1989 LSI Logic Corporation  */
/******************************************************/


MODULE SEDLYV1;

INPUTS      CP,D,DLY_POL,NOS.1,NOS.0,PXL_EN,RESET_,WAIT;
OUTPUTS     CNV,PSE,SE;

LEVEL FUNCTION;
DEFINE
  /* implicit connectors *******************/

    CP- = (CP);
    WAIT- = (WAIT);
    CNV- = (CNV);
    SE- = (SE);
    DLY_POL- = (DLY_POL);
    DLY_POL- = (DLY_POL);
    NOS-.1 = (NOS.1);
    NOS-.0 = (NOS.0);
    NOS-.1 = (NOS.1);
    NOS-.0 = (NOS.0);
    RESET_- = (RESET_);
    RESET_- = (RESET_);
    RESET_- = (RESET_);
    CP- = (CP);
    CP- = (CP);
    WAIT- = (WAIT);
    WAIT- = (WAIT);
    PXL_EN- = (PXL_EN);
    D- = (D);
    D- = (D);
    PSE- = (PSE);


 /* part instances *************************/

   U1(SE-=Z) = MUX81HB(U1.D0-=D0,U1.D1-=D1,U1.D2-=D2,U1.D3-=D3,
           U1.D4-=D4,U1.D5-=D5,U1.D6-=D6,U1.D7-=D7,U1.B-=B,U0.C-=C,
           DLY_POL-=A);
   U2(U2.RST_-.23=RST_.23,U2.RST_-.22=RST_.22,U2.RST_-.21=RST_.21,
           U2.RST_-.20=RST_.20,U2.RST_-.19=RST_.19,U2.RST_-.18=RST_.18,
           U2.RST_-.17=RST_.17,U2.RST_-.16=RST_.16,U2.RST_-.15=RST_.15,
           U2.RST_-.14=RST_.14,U2.RST_-.13=RST_.13,U2.RST_-.12=RST_.12,
           U2.RST_-.11=RST_.11,U2.RST_-.10=RST_.10,U2.RST_-.9=RST_.9,
           U2.RST_-.8=RST_.8,U2.RST_-.7=RST_.7,U2.RST_-.6=RST_.6,
           U2.RST_-.5=RST_.5,U2.RST_-.4=RST_.4,U2.RST_-.3=RST_.3,
           U2.RST_-.2=RST_.2,U2.RST_-.1=RST_.1,U2.RST_-.0=RST_.0)
            = SEDLYCNT(DLY_POL-=DLY_POL,NOS-.1=NOS.1,NOS-.0=NOS.0,
           RESET_-=RESET_);
  U4.4(U4.Q-.4=Q) = FD2SA(WAIT-=TE,CP-=CP,U4.Q-.4=TI,U4.D-.4=D,
           RESET_-=CD);
  U4.3(U4.Q-.3=Q) = FD2SA(WAIT-=TE,CP-=CP,U4.Q-.3=TI,U4.D-.3=D,
           RESET_-=CD);
  U4.2(U4.Q-.2=Q) = FD2SA(WAIT-=TE,CP-=CP,U4.Q-.2=TI,U4.D-.2=D,
           RESET_-=CD);
  U4.1(U4.Q-.1=Q) = FD2SA(WAIT-=TE,CP-=CP,U4.Q-.1=TI,U4.D-.1=D,
           RESET_-=CD);
  U4.0(U4.Q-.0=Q) = FD2SA(WAIT-=TE,CP-=CP,U4.Q-.0=TI,U4.D-.0=D,
           RESET_-=CD);
```

```
U3.23(U3.Q-.23=Q) = FD2SA(U2.RST_-.23=CD,U3.D-.23=D,U3.Q-.23=TI,
        CP-=CP,U7.Z-=TE);
U3.22(U3.Q-.22=Q) = FD2SA(U2.RST_-.22=CD,U3.D-.22=D,U3.Q-.22=TI,
        CP-=CP,U7.Z-=TE);
U3.21(U3.Q-.21=Q) = FD2SA(U2.RST_-.21=CD,U3.D-.21=D,U3.Q-.21=TI,
        CP-=CP,U7.Z-=TE);
U3.20(U3.Q-.20=Q) = FD2SA(U2.RST_-.20=CD,U3.D-.20=D,U3.Q-.20=TI,
        CP-=CP,U7.Z-=TE);
U3.19(U3.Q-.19=Q) = FD2SA(U2.RST_-.19=CD,U3.D-.19=D,U3.Q-.19=TI,
        CP-=CP,U7.Z-=TE);
U3.18(U3.Q-.18=Q) = FD2SA(U2.RST_-.18=CD,U3.D-.18=D,U3.Q-.18=TI,
        CP-=CP,U7.Z-=TE);
U3.17(U3.Q-.17=Q) = FD2SA(U2.RST_-.17=CD,U3.D-.17=D,U3.Q-.17=TI,
        CP-=CP,U7.Z-=TE);
U3.16(U3.Q-.16=Q) = FD2SA(U2.RST_-.16=CD,U3.D-.16=D,U3.Q-.16=TI,
        CP-=CP,U7.Z-=TE);
U3.15(U3.Q-.15=Q) = FD2SA(U2.RST_-.15=CD,U3.D-.15=D,U3.Q-.15=TI,
        CP-=CP,U7.Z-=TE);
U3.14(U3.Q-.14=Q) = FD2SA(U2.RST_-.14=CD,U3.D-.14=D,U3.Q-.14=TI,
        CP-=CP,U7.Z-=TE);
U3.13(U3.Q-.13=Q) = FD2SA(U2.RST_-.13=CD,U3.D-.13=D,U3.Q-.13=TI,
        CP-=CP,U7.Z-=TE);
U3.12(U3.Q-.12=Q) = FD2SA(U2.RST_-.12=CD,U3.D-.12=D,U3.Q-.12=TI,
        CP-=CP,U7.Z-=TE);
U3.11(U3.Q-.11=Q) = FD2SA(U2.RST_-.11=CD,U3.D-.11=D,U3.Q-.11=TI,
        CP-=CP,U7.Z-=TE);
U3.10(U3.Q-.10=Q) = FD2SA(U2.RST_-.10=CD,U3.D-.10=D,U3.Q-.10=TI,
        CP-=CP,U7.Z-=TE);
U3.9(U3.Q-.9=Q) = FD2SA(U2.RST_-.9=CD,U3.D-.9=D,U3.Q-.9=TI,CP-=CP,
        U7.Z-=TE);
U3.8(U3.Q-.8=Q) = FD2SA(U2.RST_-.8=CD,U3.D-.8=D,U3.Q-.8=TI,CP-=CP,
        U7.Z-=TE);
U3.7(U3.Q-.7=Q) = FD2SA(U2.RST_-.7=CD,U3.D-.7=D,U3.Q-.7=TI,CP-=CP,
        U7.Z-=TE);
U3.6(U3.Q-.6=Q) = FD2SA(U2.RST_-.6=CD,U3.D-.6=D,U3.Q-.6=TI,CP-=CP,
        U7.Z-=TE);
U3.5(U3.Q-.5=Q) = FD2SA(U2.RST_-.5=CD,U3.D-.5=D,U3.Q-.5=TI,CP-=CP,
        U7.Z-=TE);
U3.4(U3.Q-.4=Q) = FD2SA(U2.RST_-.4=CD,U3.D-.4=D,U3.Q-.4=TI,CP-=CP,
        U7.Z-=TE);
U3.3(U3.Q-.3=Q) = FD2SA(U2.RST_-.3=CD,U3.D-.3=D,U3.Q-.3=TI,CP-=CP,
        U7.Z-=TE);
U3.2(U3.Q-.2=Q) = FD2SA(U2.RST_-.2=CD,U3.D-.2=D,U3.Q-.2=TI,CP-=CP,
        U7.Z-=TE);
U3.1(U3.Q-.1=Q) = FD2SA(U2.RST_-.1=CD,U3.D-.1=D,U3.Q-.1=TI,CP-=CP,
        U7.Z-=TE);
U3.0(U3.Q-.0=Q) = FD2SA(U2.RST_-.0=CD,U3.D-.0=D,U3.Q-.0=TI,CP-=CP,
        U7.Z-=TE);
U7(U7.Z-=Z) = B3A(WAIT-=A);
U8.5(U8.Q-.5=Q) = FD2SA(RESET_-=CD,CP-=CP,U8.D-.5=D,U8.Q-.5=TI,
        WAIT-=TE);
U8.4(U8.Q-.4=Q) = FD2SA(RESET_-=CD,CP-=CP,U8.D-.4=D,U8.Q-.4=TI,
        WAIT-=TE);
U8.3(U8.Q-.3=Q) = FD2SA(RESET_-=CD,CP-=CP,U8.D-.3=D,U8.Q-.3=TI,
        WAIT-=TE);
U8.2(U8.Q-.2=Q) = FD2SA(RESET_-=CD,CP-=CP,U8.D-.2=D,U8.Q-.2=TI,
        WAIT-=TE);
U8.1(U8.Q-.1=Q) = FD2SA(RESET_-=CD,CP-=CP,U8.D-.1=D,U8.Q-.1=TI,
        WAIT-=TE);
U8.0(U8.Q-.0=Q) = FD2SA(RESET_-=CD,CP-=CP,U8.D-.0=D,U8.Q-.0=TI,
        WAIT-=TE);
U5(U5.Z-=Z) = AND2C(U6.Z-=A,U5.B-=B);
U6(U6.Z-=Z) = N1B(D-=A);
U0(PSE-=Z) = MUX81HB(U0.C-=C,U1.B-=B,DLY_POL-=A,U0.D7-=D7,U0.D6-=D6,
        U0.D5-=D5,U0.D4-=D4,U0.D3-=D3,U0.D2-=D2,U0.D1-=D1,
        U0.D0-=D0);


/* extractors ******************************/

U3.Q-.8 = (U0.D2-);
U3.Q-.23 = (U0.D7-);
U3.Q-.4 = (U0.D1-);
```

```
U3.Q-.13 = (U0.D4-);
U3.Q-.18 = (U0.D6-);
U3.Q-.10 = (U0.D3-);
U3.Q-.16 = (U0.D5-);
U4.D-.0 = (U5.Z-);
U4.Q-.4 = (CNV-);
U4.Q-.3 = (M-0.3);
U4.Q-.2 = (M-0.2);
U4.Q-.1 = (M-0.1);
U4.Q-.0 = (M-0.0);
U4.D-.4 = (M-0.3);
U4.D-.3 = (M-0.2);
U4.D-.2 = (M-0.1);
U4.D-.1 = (M-0.0);
U3.Q-.4 = (U1.D0-);
U3.Q-.5 = (U1.D1-);
U3.Q-.9 = (U1.D2-);
U3.Q-.11 = (U1.D3-);
U3.Q-.14 = (U1.D4-);
U3.Q-.17 = (U1.D5-);
U3.Q-.19 = (U1.D6-);
U3.Q-.23 = (U1.D7-);
NOS-.1 = (U0.C-);
NOS-.0 = (U1.B-);
U8.D-.0 = (PXL_EN-);
U8.D-.5 = (M-1.4);
U8.D-.4 = (M-1.3);
U8.D-.3 = (M-1.2);
U8.D-.2 = (M-1.1);
U8.D-.1 = (M-1.0);
U8.Q-.4 = (M-1.4);
U8.Q-.3 = (M-1.3);
U8.Q-.2 = (M-1.2);
U8.Q-.1 = (M-1.1);
U8.Q-.0 = (M-1.0);
U8.Q-.5 = (U5.B-);
U3.D-.0 = (D-);
U3.D-.23 = (M-2.22);
U3.D-.22 = (M-2.21);
U3.D-.21 = (M-2.20);
U3.D-.20 = (M-2.19);
U3.D-.19 = (M-2.18);
U3.D-.18 = (M-2.17);
U3.D-.17 = (M-2.16);
U3.D-.16 = (M-2.15);
U3.D-.15 = (M-2.14);
U3.D-.14 = (M-2.13);
U3.D-.13 = (M-2.12);
U3.D-.12 = (M-2.11);
U3.D-.11 = (M-2.10);
U3.D-.10 = (M-2.9);
U3.D-.9 = (M-2.8);
U3.D-.8 = (M-2.7);
U3.D-.7 = (M-2.6);
U3.D-.6 = (M-2.5);
U3.D-.5 = (M-2.4);
U3.D-.4 = (M-2.3);
U3.D-.3 = (M-2.2);
U3.D-.2 = (M-2.1);
U3.D-.1 = (M-2.0);
U3.Q-.22 = (M-2.22);
U3.Q-.21 = (M-2.21);
U3.Q-.20 = (M-2.20);
U3.Q-.19 = (M-2.19);
U3.Q-.18 = (M-2.18);
U3.Q-.17 = (M-2.17);
U3.Q-.16 = (M-2.16);
U3.Q-.15 = (M-2.15);
U3.Q-.14 = (M-2.14);
U3.Q-.13 = (M-2.13);
U3.Q-.12 = (M-2.12);
U3.Q-.11 = (M-2.11);
U3.Q-.10 = (M-2.10);
U3.Q-.9 = (M-2.9);
```

```
    U3.Q-.8 = (M-2.8);
    U3.Q-.7 = (M-2.7);
    U3.Q-.6 = (M-2.6);
    U3.Q-.5 = (M-2.5);
    U3.Q-.4 = (M-2.4);
    U3.Q-.3 = (M-2.3);
    U3.Q-.2 = (M-2.2);
    U3.Q-.1 = (M-2.1);
    U3.Q-.0 = (M-2.0);
    U3.Q-.3 = (U0.D0-);


  /* type converters *********************/

ANNOTATIONS
{
  BUS BUS_TYPE = "DOT";
}

END MODULE;



/* * * * * * *  Contents of NET file XSEQV5CR.NET  * * * * * * */

/******************************************************/
/*  Netlist copyright (C) 1989 LSI Logic Corporation  */
/******************************************************/


MODULE XSEQV5CR;

INPUTS      CO,DLY_POL,INC,RDY,SPRCYC,STBIT0I,STBIT1I,STBIT2I,
            STBIT3I,STBIT4I,STRT_FLG,WAIT;
OUTPUTS     CI,CLRSPR,CLRXAU,CNVEN,DUP,ENSPR,ENXAU,EOC,FC,LC,LC_1,
            LD_,REQ,SC,SE,STBEN,STBIT0O,STBIT1O,STBIT2O,STBIT3O,
            STBIT4O,YADRSEL,YINCEN;

LEVEL FUNCTION;
DEFINE
  /* implicit connectors *******************/

    CNVEN- = (CNVEN);
    LD_- = (LD_);
    STBIT3I- = (STBIT3I);
    YADRSEL- = (YADRSEL);
    CI- = (CI);
    STBIT1I- = (STBIT1I);
    STBIT4I- = (STBIT4I);
    STRT_FLG- = (STRT_FLG);
    LC- = (LC);
    DUP- = (DUP);
    CLRSPR- = (CLRSPR);
    RDY- = (RDY);
    STBIT4O- = (STBIT4O);
    STBIT0O- = (STBIT0O);
    ENXAU- = (ENXAU);
    STBIT2O- = (STBIT2O);
    WAIT- = (WAIT);
    STBIT2I- = (STBIT2I);
    STBIT0I- = (STBIT0I);
    YINCEN- = (YINCEN);
    CLRXAU- = (CLRXAU);
    EOC- = (EOC);
    REQ- = (REQ);
    SC- = (SC);
    FC- = (FC);
    SPRCYC- = (SPRCYC);
    INC- = (INC);
    SE- = (SE);
    LC_1- = (LC_1);
    ENSPR- = (ENSPR);
    CO- = (CO);
    STBEN- = (STBEN);
```

```
STBIT1O- = (STBIT1O);
DLY_POL- = (DLY_POL);
STBIT3O- = (STBIT3O);


/* part instances ***************************/

M9(M9.Z-=Z) = N1D(STBIT3I-=A);
M24(M24.Z-=Z) = N1D(STBIT1I-=A);
M15(M15.Z-=Z) = N1D(STBIT4I-=A);
M630(M630.Z-=Z) = N1D(M15.Z-=A);
M40(M40.Z-=Z) = N1C(STRT_FLG-=A);
M697(LC-=Z) = N1B(M45.Z-=A);
M658(M658.Z-=Z) = AND3B(M113.Z-=B,M119.Z-=C,M103.Z-=A);
M629(M629.Z-=Z) = N1D(M9.Z-=A);
M633(M633.Z-=Z) = N1D(M85.Z-=A);
M85(M85.Z-=Z) = ND2C(M629.Z-=A,M630.Z-=B);
M20(M20.Z-=Z) = AND2C(M629.Z-=A,M15.Z-=B);
M193(M193.Z-=Z) = AND3B(M24.Z-=A,M629.Z-=B,M15.Z-=C);
M110(M110.Z-=Z) = ND2B(M24.Z-=A,M623.Z-=B);
M112(M112.Z-=Z) = NR2C(M111.Z-=B,M110.Z-=A);
M111(M111.Z-=Z) = ND2B(M629.Z-=A,M630.Z-=B);
M22(M22.Z-=Z) = N1C(RDY-=A);
M612(M612.Z-=Z) = N1C(M22.Z-=A);
M432(M432.Z-=Z) = AND2B(M286.Z-=A,M298.Z-=B);
M616(M616.Z-=Z) = N1D(M24.Z-=A);
M29(M29.Z-=Z) = AND2C(M24.Z-=B,M615.Z-=A);
M52(M52.Z-=Z) = AND2C(M9.Z-=A,M15.Z-=B);
M607(M607.Z-=Z) = N1D(M40.Z-=A);
M275(M275.Z-=Z) = AND2B(M615.Z-=B,M607.Z-=A);
M113(M113.Z-=Z) = ND3C(M108.Z-=A,M109.Z-=B,M112.Z-=C);
M105(M105.Z-=Z) = AND2B(M613.Z-=B,M612.Z-=A);
M299(M299.Z-=Z) = ND4B(M24.Z-=B,M607.Z-=A,M623.Z-=C,M15.Z-=D);
M425(M425.Z-=Z) = AND2B(M169.Z-=A,M177.Z-=B);
M5(M5.Z-=Z) = N1D(WAIT-=A);
M608(M608.Z-=Z) = N1D(M28.Z-=A);
M28(M28.Z-=Z) = ND2C(M5.Z-=B,M607.Z-=A);
M470(M470.Z-=Z) = AND2B(M222.Z-=A,M230.Z-=B);
M235(M235.Z-=Z) = AND2B(M613.Z-=B,M607.Z-=A);
M623(M623.Z-=Z) = N1D(M14.Z-=A);
M14(M14.Z-=Z) = N1D(STBIT2I-=A);
M122(M122.Z-=Z) = AND3C(M616.Z-=A,M14.Z-=B,M9.Z-=C);
M30(M30.Z-=Z) = AND3B(M14.Z-=A,M9.Z-=B,M15.Z-=C);
M665(M665.Z-=Z) = N1D(M12.Z-=A);
M12(M12.Z-=Z) = ND2C(M611.Z-=B,M607.Z-=A);
M611(M611.Z-=Z) = N1C(M5.Z-=A);
M615(M615.Z-=Z) = N1D(M2.Z-=A);
M2(M2.Z-=Z) = N1E(STBIT0I-=A);
M13(M13.Z-=Z) = AND2C(M2.Z-=A,M616.Z-=B);
M125(M125.Z-=Z) = AND3B(M2.Z-=C,M5.Z-=A,M22.Z-=B);
M184(M184.Z-=Z) = AND3B(M2.Z-=B,M616.Z-=C,M5.Z-=A);
M68(M68.Z-=Z) = AND3B(M2.Z-=B,M616.Z-=C,M22.Z-=A);
M364(M364.Z-=Z) = ND3B(M629.Z-=C,M29.Z-=B,M665.Z-=A);
M371(M371.Z-=Z) = ND3B(M629.Z-=C,M13.Z-=B,M665.Z-=A);
M436(M436.Z-=Z) = AND2B(M364.Z-=A,M371.Z-=B);
M391(M391.Z-=Z) = ND4B(M611.Z-=B,M14.Z-=C,M607.Z-=A,M629.Z-=D);
M386(M386.Z-=Z) = AND2B(M2.Z-=A,M623.Z-=B);
M387(M387.Z-=Z) = ND3B(M386.Z-=B,M630.Z-=C,M665.Z-=A);
M288(M288.Z-=Z) = AND2B(M616.Z-=B,M615.Z-=A);
M374(M374.Z-=Z) = ND3B(M14.Z-=C,M288.Z-=B,M665.Z-=A);
M453(M453.Z-=Z) = ND4B(M380.Z-=D,M350.Z-=B,M346.Z-=A,M377.Z-=C);
M380(M380.Z-=Z) = ND3B(M623.Z-=C,M13.Z-=B,M665.Z-=A);
M480(M480.Z-=Z) = AND2B(M380.Z-=A,M383.Z-=B);
M478(M478.Z-=Z) = AND2B(M303.Z-=A,M307.Z-=B);
M620(M620.Z-=Z) = AND2B(M238.Z-=A,M246.Z-=B);
M471(M471.Z-=Z) = AND2B(M242.Z-=B,M238.Z-=A);
M240(M240.Z-=Z) = AND2B(M5.Z-=A,M613.Z-=B);
M19(M19.Z-=Z) = AND3C(M2.Z-=A,M616.Z-=B,M623.Z-=C);
M657(M657.Z-=Z) = AND3B(M70.Z-=A,M95.Z-=C,M86.Z-=B);
M557(M557.Z-=Z) = AND2B(M61.Z-=B,M57.Z-=A);
M31(M31.Z-=Z) = ND3C(M29.Z-=B,M30.Z-=C,M608.Z-=A);
M698(YINCEN-=Z) = N1B(M31.Z-=A);
M485(M485.Z-=Z) = AND2B(M86.Z-=A,M113.Z-=B);
M660(M660.Z-=Z) = ND2B(M141.Z-=A,M145.Z-=B);
```

```
M637(M637.Z-=Z) = AND2B(M141.Z-=A,M145.Z-=B);
M46(M46.Z-=Z) = AND3C(M5.Z-=B,M607.Z-=A,M612.Z-=C);
M402(M402.Z-=Z) = AND2C(M218.Z-=B,M214.Z-=A);
M258(M258.Z-=Z) = ND3C(M18.Z-=A,M208.Z-=B,M633.Z-=C);
M87(M87.Z-=Z) = ND2B(M2.Z-=B,M40.Z-=A);
M155(M155.Z-=Z) = AND2B(M24.Z-=A,M623.Z-=B);
M157(M157.Z-=Z) = ND3B(M155.Z-=B,M154.Z-=A,M20.Z-=C);
M512(M512.Z-=Z) = AND2B(M157.Z-=A,M161.Z-=B);
M78(M78.Z-=Z) = ND2B(M14.Z-=B,M40.Z-=A);
M593(M593.Z-=Z) = ND2B(M78.Z-=A,M82.Z-=B);
M598(EOC-=Z) = ND2B(M210.Z-=A,M258.Z-=B);
M285(M285.Z-=Z) = AND3B(M616.Z-=A,M14.Z-=B,M629.Z-=C);
M286(M286.Z-=Z) = ND3C(M200.Z-=B,M285.Z-=C,M608.Z-=A);
M200(M200.Z-=Z) = AND2B(M615.Z-=B,M22.Z-=A);
M201(M201.Z-=Z) = AND3B(M616.Z-=A,M14.Z-=B,M15.Z-=C);
M202(M202.Z-=Z) = ND3C(M200.Z-=B,M201.Z-=C,M608.Z-=A);
M667(M667.Z-=Z) = ND2B(M202.Z-=A,M206.Z-=B);
M541(M541.Z-=Z) = ND3B(M153.Z-=A,M198.Z-=C,M194.Z-=B);
M536(M536.Z-=Z) = ND2B(M61.Z-=B,M57.Z-=A);
M530(SC-=Z) = ND4B(M153.Z-=D,M49.Z-=C,M39.Z-=B,M35.Z-=A);
M458(M458.Z-=Z) = AND3B(M70.Z-=C,M53.Z-=A,M57.Z-=B);
M529(FC-=Z) = ND4B(M27.Z-=A,M353.Z-=D,M346.Z-=C,M65.Z-=B);
M654(M654.Z-=Z) = ND2B(M61.Z-=A,M65.Z-=B);
M502(M502.Z-=Z) = AND2B(M61.Z-=A,M65.Z-=B);
M35(M35.Z-=Z) = ND3C(M25.Z-=B,M34.Z-=C,M665.Z-=A);
M49(M49.Z-=Z) = ND3C(M46.Z-=A,M10.Z-=C,M47.Z-=B);
M10(M10.Z-=Z) = AND3C(M623.Z-=A,M9.Z-=B,M630.Z-=C);
M18(M18.Z-=Z) = AND3C(M3.Z-=C,M5.Z-=B,M607.Z-=A);
M3(M3.Z-=Z) = N1C(SPRCYC-=A);
M613(M613.Z-=Z) = N1C(M3.Z-=A);
M115(M115.Z-=Z) = AND3B(M2.Z-=C,M3.Z-=B,M5.Z-=A);
M75(M75.Z-=Z) = ND2B(M14.Z-=A,M9.Z-=B);
M74(M74.Z-=Z) = ND2B(M2.Z-=A,M616.Z-=B);
M76(M76.Z-=Z) = NR2B(M75.Z-=B,M74.Z-=A);
M77(M77.Z-=Z) = ND3B(M67.Z-=A,M73.Z-=B,M76.Z-=C);
M73(M73.Z-=Z) = AND3B(M3.Z-=C,M5.Z-=A,M612.Z-=B);
M366(M366.Z-=Z) = AND2B(M3.Z-=A,M24.Z-=B);
M94(M94.Z-=Z) = AND3C(M623.Z-=A,M629.Z-=B,M630.Z-=C);
M92(M92.Z-=Z) = ND2B(M2.Z-=A,M24.Z-=B);
M91(M91.Z-=Z) = ND2B(M613.Z-=B,M612.Z-=A);
M93(M93.Z-=Z) = NR2B(M92.Z-=B,M91.Z-=A);
M95(M95.Z-=Z) = ND3C(M94.Z-=C,M90.Z-=A,M93.Z-=B);
M166(M166.Z-=Z) = AND3B(M607.Z-=A,M6.Z-=C,M66.Z-=B);
M260(M260.Z-=Z) = AND3B(M2.Z-=A,M24.Z-=B,M623.Z-=C);
M67(M67.Z-=Z) = AND3C(INC-=C,M607.Z-=A,M66.Z-=B);
M586(M586.Z-=Z) = ND4B(M242.Z-=D,M222.Z-=B,M206.Z-=A,M234.Z-=C);
M581(M581.Z-=Z) = ND4B(M95.Z-=A,M113.Z-=C,M119.Z-=D,M103.Z-=B);
M580(M580.Z-=Z) = ND4B(M53.Z-=B,M57.Z-=C,M49.Z-=A,M65.Z-=D);
M582(M582.Z-=Z) = NR2B(M581.Z-=B,M580.Z-=A);
M664(M664.Z-=Z) = AND3B(M153.Z-=B,M149.Z-=A,M161.Z-=C);
M549(M549.Z-=Z) = ND2B(M149.Z-=B,M145.Z-=A);
M147(M147.Z-=Z) = AND3B(M3.Z-=A,M616.Z-=C,M615.Z-=B);
M346(M346.Z-=Z) = ND3C(M221.Z-=C,M25.Z-=B,M665.Z-=A);
M350(M350.Z-=Z) = ND3C(M221.Z-=C,M29.Z-=B,M608.Z-=A);
M221(M221.Z-=Z) = AND2B(M623.Z-=A,M9.Z-=B);
M222(M222.Z-=Z) = ND3C(M221.Z-=C,M42.Z-=A,M1.Z-=B);
M42(M42.Z-=Z) = AND3C(INC-=B,M5.Z-=C,M607.Z-=A);
M448(M448.Z-=Z) = ND4B(M242.Z-=A,M254.Z-=C,M246.Z-=B,M262.Z-=D);
M492(M492.Z-=Z) = ND4B(M250.Z-=A,M266.Z-=B,M270.Z-=C,M286.Z-=D);
M584(M584.Z-=Z) = ND4B(M190.Z-=C,M153.Z-=A,M161.Z-=B,M194.Z-=D);
M532(M532.Z-=Z) = AND3B(M141.Z-=B,M149.Z-=C,M119.Z-=A);
M16(M16.Z-=Z) = AND3B(M14.Z-=A,M629.Z-=B,M15.Z-=C);
M332(M332.Z-=Z) = AND2B(M2.Z-=B,M5.Z-=A);
M383(M383.Z-=Z) = ND3B(M276.Z-=B,M630.Z-=C,M665.Z-=A);
M276(M276.Z-=Z) = AND2B(M616.Z-=A,M14.Z-=B);
M334(M334.Z-=Z) = ND3B(M332.Z-=B,M276.Z-=C,M227.Z-=A);
M227(M227.Z-=Z) = AND2B(M607.Z-=A,M6.Z-=B);
M230(M230.Z-=Z) = ND3C(M227.Z-=A,M13.Z-=B,M16.Z-=C);
M17(M17.Z-=Z) = ND3B(M13.Z-=B,M16.Z-=C,M665.Z-=A);
M531(M531.Z-=Z) = AND3B(M53.Z-=B,M17.Z-=A,M113.Z-=C);
M534(LC_1-=Z) = ND3B(M533.Z-=C,M532.Z-=B,M531.Z-=A);
M533(M533.Z-=Z) = AND3B(M190.Z-=B,M230.Z-=C,M186.Z-=A);
M467(M467.Z-=Z) = AND3B(M202.Z-=C,M190.Z-=A,M198.Z-=B);
M513(M513.Z-=Z) = AND3B(M190.Z-=C,M169.Z-=B,M165.Z-=A);
```

```
M551(M551.Z--Z) = ND2B(M190.Z--B,M161.Z--A);
M190(M190.Z--Z) = ND3C(M52.Z--C,M187.Z--A,M51.Z--B);
M187(M187.Z--Z) = AND3C(M5.Z--B,M613.Z--C,M607.Z--A);
M234(M234.Z--Z) = ND3C(M18.Z--A,M204.Z--B,M633.Z--C);
M204(M204.Z--Z) = AND3B(M2.Z--A,M24.Z--B,M14.Z--C);
M206(M206.Z--Z) = ND3C(M187.Z--A,M204.Z--B,M633.Z--C);
M250(M250.Z--Z) = ND3C(M187.Z--A,M248.Z--B,M633.Z--C);
M248(M248.Z--Z) = AND3B(M24.Z--B,M615.Z--A,M14.Z--C);
M270(M270.Z--Z) = ND3C(M18.Z--A,M248.Z--B,M633.Z--C);
M572(M572.Z--Z) = AND2B(M250.Z--A,M270.Z--B);
M450(M450.Z--Z) = AND2B(M290.Z--B,M270.Z--A);
M338(M338.Z--Z) = ND3B(M317.Z--B,M273.Z--C,M608.Z--A);
M317(M317.Z--Z) = AND2B(M3.Z--A,M615.Z--B);
M319(M319.Z--Z) = ND3C(M317.Z--B,M314.Z--C,M608.Z--A);
M433(M433.Z--Z) = AND2B(M319.Z--B,M303.Z--A);
M409(M409.Z--Z) = AND2B(M307.Z--A,M311.Z--B);
M683(M683.Z--Z) = AND3B(M319.Z--C,M311.Z--A,M315.Z--B);
M676(M676.Z--Z) = NR2B(M675.Z--B,M669.Z--A);
M692(ENSPR--Z) = ND3B(M663.Z--A,M676.Z--B,M691.Z--C);
M691(M691.Z--Z) = NR2B(M690.Z--B,M684.Z--A);
M681(M681.Z--Z) = ND2B(M303.Z--A,M307.Z--B);
M476(M476.Z--Z) = AND2B(M290.Z--A,M294.Z--B);
M281(M281.Z--Z) = AND2B(M14.Z--A,M629.Z--B);
M282(M282.Z--Z) = ND3B(M281.Z--C,M42.Z--A,M1.Z--B);
M408(M408.Z--Z) = AND2B(M294.Z--B,M282.Z--A);
M680(M680.Z--Z) = ND2B(M294.Z--A,M298.Z--B);
M682(M682.Z--Z) = NR2B(M681.Z--B,M680.Z--A);
M684(M684.Z--Z) = ND3B(M683.Z--C,M679.Z--A,M682.Z--B);
M678(M678.Z--Z) = ND2B(M290.Z--B,M286.Z--A);
M679(M679.Z--Z) = NR2B(M678.Z--B,M677.Z--A);
M677(M677.Z--Z) = ND2B(M254.Z--A,M270.Z--B);
M254(M254.Z--Z) = ND3C(M18.Z--A,M43.Z--B,M633.Z--C);
M43(M43.Z--Z) = AND3B(M2.Z--A,M616.Z--B,M14.Z--C);
M45(M45.Z--Z) = ND3C(M20.Z--C,M42.Z--A,M43.Z--B);
M139(M139.Z--Z) = AND3B(M616.Z--C,M613.Z--A,M615.Z--B);
M141(M141.Z--Z) = ND3C(M42.Z--A,M140.Z--C,M139.Z--B);
M140(M140.Z--Z) = AND3B(M14.Z--A,M9.Z--B,M630.Z--C);
M149(M149.Z--Z) = ND3C(M42.Z--A,M147.Z--B,M140.Z--C);
M583(M583.Z--Z) = ND4B(M141.Z--B,M123.Z--A,M149.Z--D,M145.Z--C);
M585(M585.Z--Z) = NR2B(M584.Z--B,M583.Z--A);
M589(SE--Z) = ND3B(M582.Z--A,M585.Z--B,M588.Z--C);
M588(M588.Z--Z) = NR2B(M587.Z--B,M586.Z--A);
M587(M587.Z--Z) = ND4B(M327.Z--B,M361.Z--D,M357.Z--C,M274.Z--A);
M80(M80.Z--Z) = AND2C(M24.Z--A,M14.Z--B);
M82(M82.Z--Z) = ND3B(M79.Z--A,M80.Z--B,M52.Z--C);
M327(M327.Z--Z) = ND3B(M272.Z--B,M239.Z--A,M80.Z--C);
M239(M239.Z--Z) = AND2C(INC--B,M607.Z--A);
M6(M6.Z--Z) = N1C(INC--A);
M89(M89.Z--Z) = ND2B(INC--A,M5.Z--B);
M108(M108.Z--Z) = AND3C(INC--C,CO--B,M607.Z--A);
M66(M66.Z--Z) = N1C(CO--A);
M263(M263.Z--Z) = AND3B(CO--B,M611.Z--C,M607.Z--A);
M266(M266.Z--Z) = ND3B(M263.Z--A,M260.Z--B,M633.Z--C);
M262(M262.Z--Z) = ND3C(M260.Z--B,M259.Z--A,M633.Z--C);
M259(M259.Z--Z) = AND3B(M611.Z--C,M607.Z--A,M66.Z--B);
M104(M104.Z--Z) = AND2B(M607.Z--A,M66.Z--B);
M88(M88.Z--Z) = ND2B(M607.Z--A,M66.Z--B);
M90(M90.Z--Z) = NR2C(M89.Z--B,M88.Z--A);
M103(M103.Z--Z) = ND3C(M94.Z--C,M90.Z--A,M101.Z--B);
M101(M101.Z--Z) = NR2B(M99.Z--A,M92.Z--B);
M99(M99.Z--Z) = ND2B(M3.Z--B,M612.Z--A);
M1(M1.Z--Z) = AND3B(M2.Z--B,M3.Z--A,M616.Z--C);
M11(M11.Z--Z) = ND3B(M10.Z--C,M1.Z--B,M4.Z--A);
M151(M151.Z--Z) = AND3B(M2.Z--B,M24.Z--C,M613.Z--A);
M153(M153.Z--Z) = ND3C(M46.Z--A,M10.Z--C,M151.Z--B);
M27(M27.Z--Z) = ND3C(M23.Z--A,M25.Z--B,M10.Z--C);
M25(M25.Z--Z) = AND2C(M2.Z--A,M24.Z--B);
M64(M64.Z--Z) = AND3B(M623.Z--A,M9.Z--B,M15.Z--C);
M65(M65.Z--Z) = ND3C(M25.Z--B,M64.Z--C,M608.Z--A);
M546(M546.Z--Z) = ND2B(M113.Z--B,M65.Z--A);
M547(M547.Z--Z) = NR2B(M546.Z--B,M545.Z--A);
M545(M545.Z--Z) = ND2B(M53.Z--B,M45.Z--A);
M420(M420.Z--Z) = AND2B(M61.Z--B,M53.Z--A);
M500(M500.Z--Z) = AND3B(M53.Z--B,M57.Z--C,M49.Z--A);
```

```
M652(M652.Z--Z) = AND3B(M31.Z--A,M49.Z--C,M35.Z--B);
M600(M600.Z--Z) = AND2B(M95.Z--A,M103.Z--B);
M601(M601.Z--Z) = AND3B(M153.Z--B,M123.Z--A,M194.Z--C);
M602(STBEN--Z) = ND3B(M600.Z--B,M526.Z--A,M601.Z--C);
M526(M526.Z--Z) = AND2B(M57.Z--B,M49.Z--A);
M535(M535.Z--Z) = ND3B(M49.Z--C,M27.Z--A,M35.Z--B);
M537(M537.Z--Z) = NR2B(M536.Z--B,M535.Z--A);
M544(REQ--Z) = ND3B(M537.Z--A,M540.Z--B,M543.Z--C);
M543(M543.Z--Z) = NR2B(M542.Z--B,M541.Z--A);
M542(M542.Z--Z) = ND3B(M202.Z--A,M286.Z--B,M298.Z--C);
M489(M489.Z--Z) = AND2B(M202.Z--A,M210.Z--B);
M446(M446.Z--Z) = AND2B(M222.Z--B,M210.Z--A);
M596(M596.Z--Z) = AND3B(M210.Z--A,M342.Z--C,M258.Z--B);
M597(CLRXAU--Z) = ND3B(M596.Z--C,M592.Z--A,M595.Z--B);
M595(M595.Z--Z) = NR2B(M594.Z--B,M593.Z--A);
M594(M594.Z--Z) = ND2B(M87.Z--A,M157.Z--B);
M695(M695.Z--Z) = AND2B(M87.Z--A,M258.Z--B);
M405(M405.Z--Z) = AND2B(M250.Z--A,M258.Z--B);
M673(M673.Z--Z) = ND2B(M250.Z--B,M246.Z--A);
M672(M672.Z--Z) = ND2B(M242.Z--B,M238.Z--A);
M674(M674.Z--Z) = NR2B(M673.Z--B,M672.Z--A);
M675(M675.Z--Z) = ND3B(M671.Z--B,M670.Z--A,M674.Z--C);
M670(M670.Z--Z) = AND3B(M218.Z--C,M210.Z--A,M214.Z--B);
M428(M428.Z--Z) = AND2B(M214.Z--A,M230.Z--B);
M617(M617.Z--Z) = ND3B(M214.Z--C,M516.Z--B,M445.Z--A);
M516(M516.Z--Z) = AND2B(M202.Z--B,M198.Z--A);
M61(M61.Z--Z) = ND3C(M20.Z--C,M55.Z--B,M46.Z--A);
M55(M55.Z--Z) = AND3C(M616.Z--B,M615.Z--A,M14.Z--C);
M218(M218.Z--Z) = ND3C(M217.Z--C,M55.Z--B,M4.Z--A);
M57(M57.Z--Z) = ND3C(M52.Z--C,M55.Z--B,M46.Z--A);
M198(M198.Z--Z) = ND3C(M55.Z--B,M46.Z--A,M633.Z--C);
M137(M137.Z--Z) = ND3B(M132.Z--C,M46.Z--A,M47.Z--B);
M563(M563.Z--Z) = AND2B(M141.Z--B,M137.Z--A);
M397(M397.Z--Z) = AND2B(M169.Z--B,M165.Z--A);
M398(M398.Z--Z) = ND3B(M397.Z--B,M396.Z--A,M173.Z--C);
M396(M396.Z--Z) = AND2B(M153.Z--B,M141.Z--A);
M487(M487.Z--Z) = ND4B(M190.Z--D,M141.Z--A,M145.Z--B,M165.Z--C);
M488(M488.Z--Z) = NR2B(M487.Z--B,M486.Z--A);
M486(M486.Z--Z) = ND3B(M129.Z--C,M485.Z--B,M484.Z--A);
M484(M484.Z--Z) = AND2B(M70.Z--B,M31.Z--A);
M556(M556.Z--Z) = AND2B(M53.Z--B,M31.Z--A);
M558(M558.Z--Z) = ND3B(M557.Z--C,M556.Z--B,M417.Z--A);
M562(M562.Z--Z) = NR2B(M561.Z--B,M558.Z--A);
M561(M561.Z--Z) = ND3B(M123.Z--C,M559.Z--A,M507.Z--B);
M559(M559.Z--Z) = AND2B(M95.Z--B,M86.Z--A);
M86(M86.Z--Z) = ND3B(M19.Z--B,M18.Z--A,M633.Z--C);
M242(M242.Z--Z) = ND3C(M240.Z--B,M239.Z--A,M19.Z--C);
M571(M571.Z--Z) = AND2B(M242.Z--A,M246.Z--B);
M474(M474.Z--Z) = AND2B(M254.Z--B,M246.Z--A);
M477(M477.Z--Z) = ND3B(M476.Z--C,M475.Z--B,M474.Z--A);
M483(STBIT1O--Z) = ND3B(M464.Z--A,M473.Z--B,M482.Z--C);
M482(M482.Z--Z) = NR2B(M481.Z--B,M477.Z--A);
M481(M481.Z--Z) = ND3B(M480.Z--C,M479.Z--B,M478.Z--A);
M479(M479.Z--Z) = AND2B(M374.Z--B,M311.Z--A);
M625(M625.Z--Z) = AND2B(M374.Z--A,M383.Z--B);
M413(M413.Z--Z) = AND2B(M383.Z--A,M387.Z--B);
M688(M688.Z--Z) = ND2B(M387.Z--A,M391.Z--B);
M437(M437.Z--Z) = ND3B(M436.Z--B,M435.Z--A,M391.Z--C);
M435(M435.Z--Z) = AND2B(M323.Z--A,M342.Z--B);
M575(M575.Z--Z) = AND2B(M319.Z--A,M323.Z--B);
M577(M577.Z--Z) = ND3B(M576.Z--B,M575.Z--A,M361.Z--C);
M576(M576.Z--Z) = AND2B(M334.Z--A,M350.Z--B);
M495(M495.Z--Z) = ND4B(M323.Z--A,M350.Z--B,M377.Z--C,M384.Z--D);
M384(M384.Z--Z) = ND4B(M611.Z--B,M615.Z--C,M14.Z--D,M607.Z--A);
M687(M687.Z--Z) = ND2B(M380.Z--A,M384.Z--B);
M689(M689.Z--Z) = NR2B(M688.Z--B,M687.Z--A);
M690(M690.Z--Z) = ND3B(M686.Z--B,M685.Z--A,M689.Z--C);
M685(M685.Z--Z) = AND3B(M323.Z--A,M342.Z--B,M346.Z--C);
M522(M522.Z--Z) = AND3B(M374.Z--C,M353.Z--B,M346.Z--A);
M353(M353.Z--Z) = ND3B(M79.Z--A,M629.Z--C,M80.Z--B);
M79(M79.Z--Z) = AND2B(M2.Z--B,M607.Z--A);
M329(M329.Z--Z) = AND2B(M2.Z--A,M629.Z--B);
M292(M292.Z--Z) = AND2B(M2.Z--B,M611.Z--A);
M212(M212.Z--Z) = AND3B(M2.Z--B,M616.Z--C,M611.Z--A);
```

```
M214(M214.Z-=Z) = ND3C(M69.Z-=C,M67.Z-=A,M212.Z-=B);
M69(M69.Z-=Z) = AND2B(M14.Z-=A,M9.Z-=B);
M237(M237.Z-=Z) = AND3B(M14.Z-=A,M629.Z-=B,M630.Z-=C);
M238(M238.Z-=Z) = ND3C(M235.Z-=A,M13.Z-=B,M237.Z-=C);
M404(M404.Z-=Z) = AND2B(M238.Z-=B,M222.Z-=A);
M643(M643.Z-=Z) = AND2B(M202.Z-=A,M222.Z-=B);
M645(M645.Z-=Z) = ND3B(M286.Z-=C,M644.Z-=B,M643.Z-=A);
M644(M644.Z-=Z) = AND2B(M242.Z-=A,M274.Z-=B);
M274(M274.Z-=Z) = ND3B(M273.Z-=C,M272.Z-=B,M239.Z-=A);
M272(M272.Z-=Z) = AND2B(M5.Z-=A,M615.Z-=B);
M163(M163.Z-=Z) = AND3B(M2.Z-=B,M24.Z-=C,M5.Z-=A);
M169(M169.Z-=Z) = ND3C(M94.Z-=C,M166.Z-=A,M163.Z-=B);
M445(M445.Z-=Z) = AND2B(M190.Z-=B,M169.Z-=A);
M569(M569.Z-=Z) = ND3B(M222.Z-=C,M568.Z-=B,M445.Z-=A);
M568(M568.Z-=Z) = AND2B(M218.Z-=B,M198.Z-=A);
M619(M619.Z-=Z) = AND2B(M218.Z-=A,M230.Z-=B);
M671(M671.Z-=Z) = AND3B(M222.Z-=A,M230.Z-=B,M234.Z-=C);
M447(M447.Z-=Z) = ND3B(M446.Z-=B,M445.Z-=A,M234.Z-=C);
M449(M449.Z-=Z) = NR2B(M448.Z-=B,M447.Z-=A);
M455(STBIT20-=Z) = ND3B(M444.Z-=A,M449.Z-=B,M454.Z-=C);
M454(M454.Z-=Z) = NR2B(M453.Z-=B,M452.Z-=A);
M452(M452.Z-=Z) = ND3B(M311.Z-=C,M451.Z-=B,M450.Z-=A);
M451(M451.Z-=Z) = AND2B(M303.Z-=B,M299.Z-=A);
M302(M302.Z-=Z) = AND3B(M616.Z-=A,M623.Z-=B,M629.Z-=C);
M303(M303.Z-=Z) = ND3C(M154.Z-=B,M302.Z-=C,M608.Z-=A);
M154(M154.Z-=Z) = AND2B(M2.Z-=B,M613.Z-=A);
M109(M109.Z-=Z) = AND3B(M2.Z-=C,M5.Z-=A,M613.Z-=B);
M145(M145.Z-=Z) = ND3C(M122.Z-=C,M108.Z-=A,M109.Z-=B);
M294(M294.Z-=Z) = ND3C(M292.Z-=B,M223.Z-=A,M122.Z-=C);
M223(M223.Z-=Z) = AND2B(CO-=B,M607.Z-=A);
M178(M178.Z-=Z) = N1B(DLY_POL-=A);
M179(M179.Z-=Z) = AND2B(M607.Z-=A,M178.Z-=B);
M162(M162.Z-=Z) = AND3B(CO-=B,M607.Z-=A,M6.Z-=C);
M165(M165.Z-=Z) = ND3C(M94.Z-=C,M163.Z-=B,M162.Z-=A);
M466(M466.Z-=Z) = AND2B(M161.Z-=A,M165.Z-=B);
M566(M566.Z-=Z) = ND3B(M563.Z-=A,M466.Z-=C,M465.Z-=B);
M570(M570.Z-=Z) = NR2B(M569.Z-=B,M566.Z-=A);
M579(ENXAU-=Z) = ND3B(M562.Z-=A,M570.Z-=B,M578.Z-=C);
M578(M578.Z-=Z) = NR2B(M577.Z-=B,M574.Z-=A);
M574(M574.Z-=Z) = ND3B(M573.Z-=C,M572.Z-=B,M571.Z-=A);
M573(M573.Z-=Z) = AND2B(M303.Z-=A,M315.Z-=B);
M494(M494.Z-=Z) = ND4B(M290.Z-=A,M294.Z-=B,M319.Z-=D,M315.Z-=C);
M496(M496.Z-=Z) = NR2B(M495.Z-=B,M494.Z-=A);
M497(STBIT00-=Z) = ND3B(M488.Z-=A,M493.Z-=B,M496.Z-=C);
M493(M493.Z-=Z) = NR2B(M492.Z-=B,M491.Z-=A);
M491(M491.Z-=Z) = ND3B(M489.Z-=A,M402.Z-=B,M226.Z-=C);
M226(M226.Z-=Z) = ND3B(M224.Z-=B,M223.Z-=A,M122.Z-=C);
M224(M224.Z-=Z) = AND2B(M2.Z-=B,M6.Z-=A);
M4(M4.Z-=Z) = AND3B(M5.Z-=C,M607.Z-=A,M6.Z-=B);
M246(M246.Z-=Z) = ND3C(M52.Z-=C,M19.Z-=B,M4.Z-=A);
M368(M368.Z-=Z) = ND3B(M366.Z-=B,M52.Z-=C,M608.Z-=A);
M412(M412.Z-=Z) = AND2B(M338.Z-=A,M368.Z-=B);
M414(M414.Z-=Z) = ND3B(M413.Z-=B,M412.Z-=A,M390.Z-=C);
M390(M390.Z-=Z) = ND3B(M29.Z-=B,M630.Z-=C,M665.Z-=A);
M377(M377.Z-=Z) = ND3B(M623.Z-=C,M29.Z-=B,M665.Z-=A);
M686(M686.Z-=Z) = AND3B(M361.Z-=B,M350.Z-=A,M377.Z-=C);
M361(M361.Z-=Z) = ND3C(M360.Z-=C,M332.Z-=B,M239.Z-=A);
M360(M360.Z-=Z) = AND2B(M616.Z-=A,M629.Z-=B);
M106(M106.Z-=Z) = AND3B(M2.Z-=A,M616.Z-=B,M630.Z-=C);
M107(M107.Z-=Z) = ND3B(M105.Z-=B,M104.Z-=A,M106.Z-=C);
M394(M394.Z-=Z) = AND2B(M95.Z-=A,M107.Z-=B);
M651(M651.Z-=Z) = AND3B(M27.Z-=C,M21.Z-=B,M11.Z-=A);
M457(M457.Z-=Z) = AND2B(M21.Z-=A,M45.Z-=B);
M392(M392.Z-=Z) = AND2B(M27.Z-=B,M21.Z-=A);
M395(M395.Z-=Z) = ND3B(M394.Z-=C,M393.Z-=B,M392.Z-=A);
M399(M399.Z-=Z) = NR2B(M398.Z-=B,M395.Z-=A);
M416(STBIT40-=Z) = ND3B(M399.Z-=A,M407.Z-=B,M415.Z-=C);
M415(M415.Z-=Z) = NR2B(M414.Z-=B,M411.Z-=A);
M411(M411.Z-=Z) = ND3B(M410.Z-=C,M409.Z-=B,M408.Z-=A);
M410(M410.Z-=Z) = AND2B(M315.Z-=A,M330.Z-=B);
M330(M330.Z-=Z) = ND3B(M329.Z-=B,M630.Z-=C,M665.Z-=A);
M290(M290.Z-=Z) = ND3C(M288.Z-=B,M64.Z-=C,M665.Z-=A);
M646(M646.Z-=Z) = AND2B(M290.Z-=A,M298.Z-=B);
M298(M298.Z-=Z) = ND3C(M23.Z-=A,M25.Z-=B,M20.Z-=C);
```

```
M23(M23.Z--Z) = AND2B(M607.Z--A,M22.Z--B);
M131(M131.Z--Z) = AND3B(M2.Z--B,M24.Z--C,M22.Z--A);
M133(M133.Z--Z) = ND3B(M132.Z--C,M67.Z--A,M131.Z--B);
M132(M132.Z--Z) = AND2B(M623.Z--A,M629.Z--B);
M34(M34.Z--Z) = AND3B(M623.Z--A,M629.Z--B,M15.Z--C);
M39(M39.Z--Z) = ND3B(M23.Z--A,M25.Z--B,M34.Z--C);
M590(M590.Z--Z) = ND2B(M39.Z--B,M35.Z--A);
M592(M592.Z--Z) = NR2B(M591.Z--B,M590.Z--A);
M591(M591.Z--Z) = ND2B(M41.Z--A,M71.Z--B);
M503(M503.Z--Z) = AND2B(M70.Z--A,M71.Z--B);
M693(M693.Z--Z) = AND2B(M41.Z--A,M71.Z--B);
M696(CLRSPR--Z) = ND3B(M695.Z--C,M694.Z--B,M693.Z--A);
M694(M694.Z--Z) = AND2B(M78.Z--A,M82.Z--B);
M393(M393.Z--Z) = AND2B(M61.Z--A,M82.Z--B);
M605(M605.Z--Z) = AND2B(M70.Z--B,M61.Z--A);
M632(M632.Z--Z) = AND2B(M70.Z--A,M95.Z--B);
M634(M634.Z--Z) = ND3B(M119.Z--C,M632.Z--A,M460.Z--B);
M635(M635.Z--Z) = NR2B(M634.Z--B,M631.Z--A);
M631(M631.Z--Z) = ND3B(M61.Z--C,M604.Z--B,M441.Z--A);
M604(M604.Z--Z) = AND2B(M53.Z--A,M57.Z--B);
M653(M653.Z--Z) = ND2B(M53.Z--A,M57.Z--B);
M655(M655.Z--Z) = NR2B(M654.Z--B,M653.Z--A);
M656(M656.Z--Z) = ND3B(M652.Z--B,M651.Z--A,M655.Z--C);
M663(M663.Z--Z) = NR2B(M662.Z--B,M656.Z--A);
M662(M662.Z--Z) = ND3B(M658.Z--B,M657.Z--A,M661.Z--C);
M661(M661.Z--Z) = NR2B(M660.Z--B,M659.Z--A);
M659(M659.Z--Z) = ND2B(M123.Z--A,M129.Z--B);
M508(M508.Z--Z) = AND2B(M123.Z--A,M129.Z--B);
M461(M461.Z--Z) = AND2B(M123.Z--B,M119.Z--A);
M548(M548.Z--Z) = ND2B(M141.Z--B,M119.Z--A);
M550(M550.Z--Z) = NR2B(M549.Z--B,M548.Z--A);
M554(DUP--Z) = ND3B(M547.Z--A,M550.Z--B,M553.Z--C);
M553(M553.Z--Z) = NR2B(M552.Z--B,M551.Z--A);
M552(M552.Z--Z) = ND2B(M206.Z--A,M234.Z--B);
M401(M401.Z--Z) = AND2B(M210.Z--B,M206.Z--A);
M429(M429.Z--Z) = ND3B(M238.Z--C,M428.Z--B,M401.Z--A);
M430(M430.Z--Z) = NR2B(M429.Z--B,M426.Z--A);
M426(M426.Z--Z) = ND3B(M425.Z--B,M424.Z--A,M194.Z--C);
M424(M424.Z--Z) = AND2B(M149.Z--A,M161.Z--B);
M639(M639.Z--Z) = AND2B(M153.Z--A,M161.Z--B);
M641(M641.Z--Z) = ND3B(M198.Z--C,M640.Z--B,M639.Z--A);
M640(M640.Z--Z) = AND2B(M190.Z--A,M194.Z--B);
M666(M666.Z--Z) = ND2B(M198.Z--B,M194.Z--A);
M668(M668.Z--Z) = NR2B(M667.Z--B,M666.Z--A);
M669(M669.Z--Z) = ND3B(M664.Z--A,M513.Z--B,M668.Z--C);
M514(M514.Z--Z) = ND3B(M512.Z--B,M511.Z--A,M513.Z--C);
M511(M511.Z--Z) = AND2B(M153.Z--B,M149.Z--A);
M443(M443.Z--Z) = ND4B(M153.Z--D,M95.Z--A,M113.Z--B,M145.Z--C);
M444(M444.Z--Z) = NR2B(M443.Z--B,M442.Z--A);
M442(M442.Z--Z) = ND3B(M61.Z--C,M441.Z--B,M417.Z--A);
M441(M441.Z--Z) = AND2B(M49.Z--B,M27.Z--A);
M498(M498.Z--Z) = AND2B(M27.Z--A,M35.Z--B);
M418(M418.Z--Z) = AND2B(M35.Z--A,M45.Z--B);
M603(M603.Z--Z) = AND2B(M17.Z--A,M45.Z--B);
M606(M606.Z--Z) = ND3B(M605.Z--C,M604.Z--B,M603.Z--A);
M610(M610.Z--Z) = NR2B(M609.Z--B,M606.Z--A);
M609(M609.Z--Z) = ND3B(M123.Z--C,M600.Z--A,M507.Z--B);
M507(M507.Z--Z) = AND2B(M113.Z--A,M119.Z--B);
M460(M460.Z--Z) = AND2B(M113.Z--B,M103.Z--A);
M463(M463.Z--Z) = ND3B(M462.Z--C,M461.Z--B,M460.Z--A);
M464(M464.Z--Z) = NR2B(M463.Z--B,M459.Z--A);
M459(M459.Z--Z) = ND3B(M457.Z--B,M456.Z--A,M458.Z--C);
M456(M456.Z--Z) = AND2B(M17.Z--B,M11.Z--A);
M417(M417.Z--Z) = AND2B(M21.Z--B,M11.Z--A);
M419(M419.Z--Z) = ND3B(M49.Z--C,M418.Z--B,M417.Z--A);
M423(M423.Z--Z) = NR2B(M422.Z--B,M419.Z--A);
M422(M422.Z--Z) = ND3B(M129.Z--C,M421.Z--B,M420.Z--A);
M421(M421.Z--Z) = AND2B(M95.Z--A,M119.Z--B);
M504(M504.Z--Z) = AND3B(M87.Z--B,M78.Z--A,M95.Z--C);
M505(M505.Z--Z) = ND3B(M503.Z--B,M502.Z--A,M504.Z--C);
M506(M506.Z--Z) = NR2B(M505.Z--B,M501.Z--A);
M501(M501.Z--Z) = ND3B(M499.Z--B,M498.Z--A,M500.Z--C);
M499(M499.Z--Z) = AND2B(M41.Z--B,M39.Z--A);
M41(M41.Z--Z) = ND2B(M24.Z--B,M40.Z--A);
```

```
M71(M71.Z--Z) = ND3B(M9.Z--B,M15.Z--C,M40.Z--A);
M273(M273.Z--Z) = AND2B(M24.Z--A,M15.Z--B);
M47(M47.Z--Z) = AND3B(M2.Z--B,M3.Z--A,M24.Z--C);
M173(M173.Z--Z) = ND3B(M20.Z--C,M46.Z--A,M47.Z--B);
M528(CI--Z) = ND3B(M527.Z--B,M526.Z--A,M173.Z--C);
M527(M527.Z--Z) = AND2B(M77.Z--A,M103.Z--B);
M538(M538.Z--Z) = ND3B(M70.Z--A,M95.Z--B,M103.Z--C);
M540(M540.Z--Z) = NR2B(M539.Z--B,M538.Z--A);
M539(M539.Z--Z) = ND2B(M123.Z--A,M133.Z--B);
M636(M636.Z--Z) = AND2B(M123.Z--A,M133.Z--B);
M638(M638.Z--Z) = ND3B(M149.Z--C,M637.Z--B,M636.Z--A);
M642(M642.Z--Z) = NR2B(M641.Z--B,M638.Z--A);
M650(YADRSEL--Z) = ND3B(M635.Z--A,M642.Z--B,M649.Z--C);
M649(M649.Z--Z) = NR2B(M648.Z--B,M645.Z--A);
M648(M648.Z--Z) = ND3B(M647.Z--B,M646.Z--A,M361.Z--C);
M647(M647.Z--Z) = AND2B(M327.Z--A,M357.Z--B);
M357(M357.Z--Z) = ND3B(M356.Z--C,M272.Z--B,M239.Z--A);
M356(M356.Z--Z) = AND2B(M24.Z--A,M9.Z--B);
M314(M314.Z--Z) = AND3B(M24.Z--A,M9.Z--B,M630.Z--C);
M315(M315.Z--Z) = ND3C(M313.Z--B,M314.Z--C,M608.Z--A);
M313(M313.Z--Z) = AND2B(M613.Z--A,M615.Z--B);
M208(M208.Z--Z) = AND3B(M24.Z--B,M615.Z--A,M623.Z--C);
M210(M210.Z--Z) = ND3C(M187.Z--A,M208.Z--B,M633.Z--C);
M278(M278.Z--Z) = ND3B(M276.Z--B,M275.Z--A,M633.Z--C);
M406(M406.Z--Z) = ND3B(M405.Z--B,M404.Z--A,M278.Z--C);
M407(M407.Z--Z) = NR2B(M406.Z--B,M403.Z--A);
M403(M403.Z--Z) = ND3B(M401.Z--B,M400.Z--A,M402.Z--C);
M400(M400.Z--Z) = AND2B(M177.Z--A,M182.Z--B);
M182(M182.Z--Z) = ND3B(M181.Z--C,M179.Z--A,M29.Z--B);
M311(M311.Z--Z) = ND3C(M235.Z--A,M181.Z--C,M13.Z--B);
M307(M307.Z--Z) = ND3C(M227.Z--A,M69.Z--C,M13.Z--B);
M624(M624.Z--Z) = AND2B(M294.Z--A,M307.Z--B);
M626(M626.Z--Z) = ND3B(M625.Z--C,M624.Z--B,M475.Z--A);
M475(M475.Z--Z) = AND2B(M266.Z--A,M286.Z--B);
M518(M518.Z--Z) = AND3B(M266.Z--B,M286.Z--C,M262.Z--A);
M519(M519.Z--Z) = ND3B(M516.Z--A,M402.Z--B,M518.Z--C);
M472(M472.Z--Z) = ND3B(M471.Z--C,M470.Z--B,M402.Z--A);
M473(M473.Z--Z) = NR2B(M472.Z--B,M468.Z--A);
M468(M468.Z--Z) = ND3B(M466.Z--B,M465.Z--A,M467.Z--C);
M465(M465.Z--Z) = AND2B(M149.Z--B,M145.Z--A);
M509(M509.Z--Z) = AND3B(M141.Z--B,M137.Z--A,M145.Z--C);
M510(M510.Z--Z) = ND3B(M508.Z--B,M507.Z--A,M509.Z--C);
M515(M515.Z--Z) = NR2B(M514.Z--B,M510.Z--A);
M525(LD_--Z) = ND3B(M506.Z--A,M515.Z--B,M524.Z--C);
M524(M524.Z--Z) = NR2B(M523.Z--B,M519.Z--A);
M523(M523.Z--Z) = ND3B(M521.Z--B,M476.Z--A,M522.Z--C);
M521(M521.Z--Z) = AND2B(M307.Z--A,M342.Z--B);
M342(M342.Z--Z) = ND3C(M217.Z--C,M79.Z--A,M80.Z--B);
M217(M217.Z--Z) = AND2B(M9.Z--A,M630.Z--B);
M181(M181.Z--Z) = AND2B(M623.Z--A,M630.Z--B);
M51(M51.Z--Z) = AND3B(M616.Z--B,M615.Z--A,M623.Z--C);
M53(M53.Z--Z) = ND3C(M52.Z--C,M18.Z--A,M51.Z--B);
M21(M21.Z--Z) = ND3C(M20.Z--C,M19.Z--B,M18.Z--A);
M323(M323.Z--Z) = ND3C(M29.Z--B,M20.Z--C,M608.Z--A);
M194(M194.Z--Z) = ND3C(M192.Z--B,M193.Z--C,M608.Z--A);
M192(M192.Z--Z) = AND2B(M2.Z--B,M612.Z--A);
M121(M121.Z--Z) = AND3B(M2.Z--C,M5.Z--A,M612.Z--B);
M123(M123.Z--Z) = ND3C(M122.Z--C,M67.Z--A,M121.Z--B);
M70(M70.Z--Z) = ND3C(M69.Z--C,M67.Z--A,M68.Z--B);
M177(M177.Z--Z) = ND3B(M67.Z--A,M68.Z--B,M30.Z--C);
M186(M186.Z--Z) = ND3B(M108.Z--A,M184.Z--B,M30.Z--C);
M161(M161.Z--Z) = ND3C(M122.Z--C,M108.Z--A,M115.Z--B);
M119(M119.Z--Z) = ND3C(M108.Z--A,M115.Z--B,M112.Z--C);
M129(M129.Z--Z) = ND3C(M67.Z--A,M125.Z--B,M112.Z--C);
M462(M462.Z--Z) = AND2B(M141.Z--B,M129.Z--A);
M614(M614.Z--Z) = ND3B(M466.Z--C,M465.Z--B,M462.Z--A);
M618(M618.Z--Z) = NR2B(M617.Z--B,M614.Z--A);
M628(CNVEN--Z) = ND3B(M610.Z--A,M618.Z--B,M627.Z--C);
M627(M627.Z--Z) = NR2B(M626.Z--B,M622.Z--A);
M622(M622.Z--Z) = ND3B(M621.Z--C,M620.Z--B,M619.Z--A);
M621(M621.Z--Z) = AND2B(M254.Z--A,M262.Z--B);
M431(M431.Z--Z) = AND2B(M250.Z--A,M262.Z--B);
M434(M434.Z--Z) = ND3B(M433.Z--C,M432.Z--B,M431.Z--A);
M438(M438.Z--Z) = NR2B(M437.Z--B,M434.Z--A);
M439(STBIT30--Z) = ND3B(M423.Z--A,M430.Z--B,M438.Z--C);
```

```
  /* extractors ******************************/


  /* type converters *********************/

ANNOTATIONS
{
  BUS BUS_TYPE = "DOT";
}

END MODULE;


/* * * * * * *  Contents of NET file STBV2.NET  * * * * * * */

/*******************************************************/
/*  Netlist copyright (C) 1989 LSI Logic Corporation  */
/*******************************************************/


MODULE STBV2;

INPUTS      CP,RESET_,STBEN;
OUTPUTS     STB;

LEVEL FUNCTION;
DEFINE
  /* implicit connectors *******************/

    RESET_- = (RESET_);
    CP- = (CP);
    STBEN- = (STBEN);
    CP- = (CP);
    CP- = (CP);
    STB- = (STB);


  /* part instances **************************/

    U4(U4.Z-=Z) = ND2C(U1.Z-=A,CP-=B);
    U1(U1.Z-=Z) = ND3C(U3.Z-=A,U4.Z-=B,RESET_-=C);
    U3(U3.Z-=Z) = ND2B(U2.Z-=A,STBEN-=B);
    U2(U2.Z-=Z) = N1B(CP-=A);
    U0(STB-=Z) = AND2C(U1.Z-=B,CP-=A);


  /* extractors ******************************/


  /* type converters *********************/

ANNOTATIONS
{
  BUS BUS_TYPE = "DOT";
}

END MODULE;


/* * * * * * *  Contents of NET file XSEQV5FN.NET  * * * * * * */

/*******************************************************/
/*  Netlist copyright (C) 1989 LSI Logic Corporation  */
/*******************************************************/


MODULE XSEQV5FN;

INPUTS      CO,CP,DLY_POL,INC,RDY,RESET_,SPRCYC,STRT_FLG,WAIT;
OUTPUTS     CI,CLRSPR_,CLRXAU,CNVEN,DUP,ENSPR,ENXAU,EOC,FC,LC,
            LC_1,LD_,REQ,SC,SE,STB,YADRSEL,YINCEN;
```

```
LEVEL FUNCTION;
DEFINE
  /* implicit connectors *******************/

    RESET_- = (RESET_);
    BRESET_- = (BRESET_);
    CP- = (CP);
    CO- = (CO);
    DLY_POL- = (DLY_POL);
    INC- = (INC);
    RDY- = (RDY);
    SPRCYC- = (SPRCYC);
    STRT_FLG- = (STRT_FLG);
    WAIT- = (WAIT);
    BRESET_- = (BRESET_);
    CP- = (CP);
    STB- = (STB);
    CLRSPR_- = (CLRSPR_);
    BRESET_- = (BRESET_);
    BRESET_- = (BRESET_);
    CP- = (CP);
    CP- = (CP);
    LD_- = (LD_);
    ENXAU- = (ENXAU);
    CI- = (CI);
    FC- = (FC);
    CNVEN- = (CNVEN);
    LC- = (LC);
    DUP- = (DUP);
    YINCEN- = (YINCEN);
    CLRXAU- = (CLRXAU);
    YADRSEL- = (YADRSEL);
    SE- = (SE);
    ENSPR- = (ENSPR);
    LC_1- = (LC_1);
    EOC- = (EOC);
    REQ- = (REQ);
    SC- = (SC);


  /* part instances **************************/

    U4(BRESET_-=Z) = B3A(RESET_-=A);
    U5(STB-=STB) = STBV2(BRESET_-=RESET_,CP-=CP,U3.STBEN-=STBEN);
    U3(U3.CLRSPR-=CLRSPR,U3.YINCEN-=YINCEN,U3.YADRSEL-=YADRSEL,
            U3.SE-=SE,U3.SC-=SC,U3.REQ-=REQ,U3.LD_-=LD_,U3.LC_1-=LC_1,
            U3.LC-=LC,U3.FC-=FC,U3.EOC-=EOC,U3.ENXAU-=ENXAU,
            U3.ENSPR-=ENSPR,U3.DUP-=DUP,U3.CNVEN-=CNVEN,
            U3.CLRXAU-=CLRXAU,U3.CI-=CI,U3.STBIT4O-=STBIT4O,
            U3.STBIT3O-=STBIT3O,U3.STBIT2O-=STBIT2O,U3.STBIT1O-=STBIT1O,
            U3.STBIT0O-=STBIT0O,U3.STBEN-=STBEN) = XSEQV5CR(CO-=CO,
            DLY_POL-=DLY_POL,INC-=INC,RDY-=RDY,SPRCYC-=SPRCYC,
            STRT_FLG-=STRT_FLG,WAIT-=WAIT,U3.STBIT4I-=STBIT4I,
            U3.STBIT3I-=STBIT3I,U3.STBIT2I-=STBIT2I,U3.STBIT1I-=STBIT1I,
            U3.STBIT0I-=STBIT0I);
    U2(CLRSPR_-=QN) = FD4A(CP-=CP,U3.CLRSPR-=D,BRESET_-=SD);
    U0.4(U0.Q-.4=Q) = FD2A(U0.D-.4=D,CP-=CP,BRESET_-=CD);
    U0.3(U0.Q-.3=Q) = FD2A(U0.D-.3=D,CP-=CP,BRESET_-=CD);
    U0.2(U0.Q-.2=Q) = FD2A(U0.D-.2=D,CP-=CP,BRESET_-=CD);
    U0.1(U0.Q-.1=Q) = FD2A(U0.D-.1=D,CP-=CP,BRESET_-=CD);
    U0.0(U0.Q-.0=Q) = FD2A(U0.D-.0=D,CP-=CP,BRESET_-=CD);
    U1.15(U1.Q-.15=Q) = FD2A(BRESET_-=CD,U1.D-.15=D,CP-=CP);
    U1.14(U1.Q-.14=Q) = FD2A(BRESET_-=CD,U1.D-.14=D,CP-=CP);
    U1.13(U1.Q-.13=Q) = FD2A(BRESET_-=CD,U1.D-.13=D,CP-=CP);
    U1.12(U1.Q-.12=Q) = FD2A(BRESET_-=CD,U1.D-.12=D,CP-=CP);
    U1.11(U1.Q-.11=Q) = FD2A(BRESET_-=CD,U1.D-.11=D,CP-=CP);
    U1.10(U1.Q-.10=Q) = FD2A(BRESET_-=CD,U1.D-.10=D,CP-=CP);
    U1.9(U1.Q-.9=Q) = FD2A(BRESET_-=CD,U1.D-.9=D,CP-=CP);
    U1.8(U1.Q-.8=Q) = FD2A(BRESET_-=CD,U1.D-.8=D,CP-=CP);
    U1.7(U1.Q-.7=Q) = FD2A(BRESET_-=CD,U1.D-.7=D,CP-=CP);
    U1.6(U1.Q-.6=Q) = FD2A(BRESET_-=CD,U1.D-.6=D,CP-=CP);
    U1.5(U1.Q-.5=Q) = FD2A(BRESET_-=CD,U1.D-.5=D,CP-=CP);
    U1.4(U1.Q-.4=Q) = FD2A(BRESET_-=CD,U1.D-.4=D,CP-=CP);
    U1.3(U1.Q-.3=Q) = FD2A(BRESET_-=CD,U1.D-.3=D,CP-=CP);
```

```
   U1.2(U1.Q-.2=Q) = FD2A(BRESET_-=CD,U1.D-.2=D,CP-=CP);
   U1.1(U1.Q-.1=Q) = FD2A(BRESET_-=CD,U1.D-.1=D,CP-=CP);
   U1.0(U1.Q-.0=Q) = FD2A(BRESET_-=CD,U1.D-.0=D,CP-=CP);

 /* extractors ******************************/

   U1.D-.14 = (U3.YADRSEL-);
   U1.D-.9 = (U3.LC_1-);
   U1.D-.11 = (U3.REQ-);
   U1.D-.4 = (U3.ENSPR-);
   U1.D-.10 = (U3.LD_-);
   U1.D-.12 = (U3.SC-);
   U1.D-.15 = (U3.YINCEN-);
   U1.D-.8 = (U3.LC-);
   U1.D-.1 = (U3.CLRXAU-);
   U1.D-.13 = (U3.SE-);
   U1.D-.7 = (U3.FC-);
   U1.D-.5 = (U3.ENXAU-);
   U1.D-.6 = (U3.EOC-);
   U1.D-.2 = (U3.CNVEN-);
   U1.D-.3 = (U3.DUP-);
   U1.D-.0 = (U3.CI-);
   U0.D-.3 = (U3.STBIT3O-);
   U0.D-.2 = (U3.STBIT2O-);
   U0.D-.1 = (U3.STBIT1O-);
   U0.D-.4 = (U3.STBIT4O-);
   U0.D-.0 = (U3.STBIT0O-);
   U0.Q-.1 = (U3.STBIT1I-);
   U0.Q-.3 = (U3.STBIT3I-);
   U0.Q-.4 = (U3.STBIT4I-);
   U0.Q-.2 = (U3.STBIT2I-);
   U0.Q-.0 = (U3.STBIT0I-);
   U1.Q-.10 = (LD_-);
   U1.Q-.5 = (ENXAU-);
   U1.Q-.0 = (CI-);
   U1.Q-.7 = (FC-);
   U1.Q-.2 = (CNVEN-);
   U1.Q-.8 = (LC-);
   U1.Q-.3 = (DUP-);
   U1.Q-.15 = (YINCEN-);
   U1.Q-.1 = (CLRXAU-);
   U1.Q-.14 = (YADRSEL-);
   U1.Q-.13 = (SE-);
   U1.Q-.4 = (ENSPR-);
   U1.Q-.9 = (LC_1-);
   U1.Q-.6 = (EOC-);
   U1.Q-.11 = (REQ-);
   U1.Q-.12 = (SC-);

 /* type converters **********************/

ANNOTATIONS
{
 BUS BUS_TYPE = "DOT";
}

END MODULE;


/* * * * * * *  Contents of NET file X_CNTV5.NET  * * * * * * */

/*******************************************************/
/*  Netlist copyright (C) 1989 LSI Logic Corporation  */
/*******************************************************/


MODULE X_CNTV5;

INPUTS       CP,CS_,DLY_POL,HLT,INC,INROW,NOS.1,NOS.0,PDI.15,
             PDI.14,PDI.13,PDI.12,PDI.11,PDI.10,PDI.9,PDI.8,PDI.7,
             PDI.6,PDI.5,PDI.4,PDI.3,PDI.2,PDI.1,PDI.0,PXL_EN,RDY,
```

```
            RESET_,SPRCYC,STRT_FLG,S_MODE,WAIT,WR_,YDWN,YUP;
OUTPUTS     CLRSPR_,CLRXAU,CMAGEN,DUP,ENSPR,ENXAU,EOC,FIRST,LAST,
            LSTMINUS1,PSE,REQ,REQ_O,S,SE,SECOND,STB,YADRSEL,
            YINCEN;

LEVEL FUNCTION;
DEFINE
  /* implicit connectors ******************/

    WR_- = (WR_);
    CLRSPR_- = (CLRSPR_);
    ENSPR- = (ENSPR);
    RDY- = (RDY);
    INC- = (INC);
    SPRCYC- = (SPRCYC);
    YINCEN- = (YINCEN);
    FIRST- = (FIRST);
    SECOND- = (SECOND);
    LSTMINUS1- = (LSTMINUS1);
    LAST- = (LAST);
    YADRSEL- = (YADRSEL);
    EOC- = (EOC);
    ENXAU- = (ENXAU);
    CLRXAU- = (CLRXAU);
    PSE- = (PSE);
    SE- = (SE);
    DLY_POL- = (DLY_POL);
    CNVEN- = (CNVEN);
    CNVEN- = (CNVEN);
    CMAGEN- = (CMAGEN);
    CP- = (CP);
    RESET_- = (RESET_);
    BRESET_- = (BRESET_);
    BRESET_- = (BRESET_);
    CP- = (CP);
    REQ_O- = (REQ_O);
    BRESET_- = (BRESET_);
    BRESET_- = (BRESET_);
    DUP- = (DUP);
    CP- = (CP);
    SMPWT- = (SMPWT);
    SMPWT- = (SMPWT);
    BRESET_- = (BRESET_);
    REQ- = (REQ);
    REQ- = (REQ);
    S- = (S);
    CP- = (CP);
    SMPWT- = (SMPWT);
    SMPWT- = (SMPWT);
    SMPWT- = (SMPWT);
    DLY_POL- = (DLY_POL);
    NOS-.1 = (NOS.1);
    NOS-.0 = (NOS.0);
    NOS-.1 = (NOS.1);
    NOS-.0 = (NOS.0);
    NOS-.1 = (NOS.1);
    NOS-.0 = (NOS.0);
    BRESET_- = (BRESET_);
    S_MODE- = (S_MODE);
    YDWN- = (YDWN);
    YUP- = (YUP);
    CO- = (CO);
    CO- = (CO);
    BRESET_- = (BRESET_);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
```

```
  PDI-.5 = (PDI.5);
  PDI-.4 = (PDI.4);
  PDI-.3 = (PDI.3);
  PDI-.2 = (PDI.2);
  PDI-.1 = (PDI.1);
  PDI-.0 = (PDI.0);
  BRESET_- = (BRESET_);
  CP- = (CP);
  BRESET_- = (BRESET_);
  BRESET_- = (BRESET_);
  INROW- = (INROW);
  HLT- = (HLT);
  WAIT- = (WAIT);
  WAIT- = (WAIT);
  CP- = (CP);
  CP- = (CP);
  DLY_POL- = (DLY_POL);
  DLY_POL- = (DLY_POL);
  PXL_EN- = (PXL_EN);
  STB- = (STB);
  STRT_FLG- = (STRT_FLG);
  CS_- = (CS_);


/* part instances *************************/

  U2(BRESET_-=Z) = B3A(RESET_-=A);
  U14(U14.Z-=Z) = AND2B(U12.CNV-=A,U10.CNVEN-=B);
  U13(REQ_O-=Q) = FD2A(CP-=CP,U14.Z-=D,BRESET_-=CD);
  U6(SMPWT-=Z) = B3A(U0.Q-=A);
  U16(S-=Z) = N1C(U15.QN-=A);
  U15(U15.QN-=QN,U15.Q-=Q) = FD2SA(BRESET_-=CD,REQ-=D,U15.Q-=TI,
          CP-=CP,SMPWT-=TE);
  U11(DUP-=DUP) = DUPDLY(U5.DUP-=D,BRESET_-=RESET_,CP-=CP,SMPWT-=WAIT,
          DLY_POL-=DLY_POL,NOS-.1=NOS.1,NOS-.0=NOS.0);
  U19(U19.Z-=Z) = AND2A(YDWN-=B,YUP-=A);
  U17(U17.Z-=Z) = N1B(U18.Z-=A);
  U18(U18.Z-=Z) = MX21LB(S_MODE-=S,U19.Z-=B,CO-=A);
  U7(U7.Z-=Z) = AND2B(U1.Z-=A,BRESET_-=B);
  U8.15(U8.Q-.15=Q) = FD2A(U1.Z-=CP,PDI-.15=D,BRESET_-=CD);
  U8.14(U8.Q-.14=Q) = FD2A(U1.Z-=CP,PDI-.14=D,BRESET_-=CD);
  U8.13(U8.Q-.13=Q) = FD2A(U1.Z-=CP,PDI-.13=D,BRESET_-=CD);
  U8.12(U8.Q-.12=Q) = FD2A(U1.Z-=CP,PDI-.12=D,BRESET_-=CD);
  U8.11(U8.Q-.11=Q) = FD2A(U1.Z-=CP,PDI-.11=D,BRESET_-=CD);
  U8.10(U8.Q-.10=Q) = FD2A(U1.Z-=CP,PDI-.10=D,BRESET_-=CD);
  U8.9(U8.Q-.9=Q) = FD2A(U1.Z-=CP,PDI-.9=D,BRESET_-=CD);
  U8.8(U8.Q-.8=Q) = FD2A(U1.Z-=CP,PDI-.8=D,BRESET_-=CD);
  U8.7(U8.Q-.7=Q) = FD2A(U1.Z-=CP,PDI-.7=D,BRESET_-=CD);
  U8.6(U8.Q-.6=Q) = FD2A(U1.Z-=CP,PDI-.6=D,BRESET_-=CD);
  U8.5(U8.Q-.5=Q) = FD2A(U1.Z-=CP,PDI-.5=D,BRESET_-=CD);
  U8.4(U8.Q-.4=Q) = FD2A(U1.Z-=CP,PDI-.4=D,BRESET_-=CD);
  U8.3(U8.Q-.3=Q) = FD2A(U1.Z-=CP,PDI-.3=D,BRESET_-=CD);
  U8.2(U8.Q-.2=Q) = FD2A(U1.Z-=CP,PDI-.2=D,BRESET_-=CD);
  U8.1(U8.Q-.1=Q) = FD2A(U1.Z-=CP,PDI-.1=D,BRESET_-=CD);
  U8.0(U8.Q-.0=Q) = FD2A(U1.Z-=CP,PDI-.0=D,BRESET_-=CD);
  U9(CO-=CO) = CNT16D(U8.Q-.15=DI.15,U8.Q-.14=DI.14,U8.Q-.13=DI.13,
          U8.Q-.12=DI.12,U8.Q-.11=DI.11,U8.Q-.10=DI.10,U8.Q-.9=DI.9,
          U8.Q-.8=DI.8,U8.Q-.7=DI.7,U8.Q-.6=DI.6,U8.Q-.5=DI.5,
          U8.Q-.4=DI.4,U8.Q-.3=DI.3,U8.Q-.2=DI.2,U8.Q-.1=DI.1,
          U8.Q-.0=DI.0,BRESET_-=RESET_,U5.LD_-=LD_,U5.CI-=CI,
          CP-=CP);
  U4(U4.Z-=Z) = N1B(INROW-=A);
  U3(U3.Z-=Z) = OR3C(U4.Z-=A,HLT-=B,WAIT-=C);
  U0(U0.Q-=Q) = FD2A(BRESET_-=CD,WAIT-=D,CP-=CP);
  U10(U10.CNVEN-=CNVEN,CMAGEN-=CMAGEN) = CNVDLY(CNVEN-=D,BRESET_-=RESET_,
          NOS-.1=NOS.1,NOS-.0=NOS.0,DLY_POL-=DLY_POL,SMPWT-=WAIT,
          CP-=CP);
  U12(U12.CNV-=CNV,PSE-=PSE,SE-=SE) = SEDLYV1(BRESET_-=RESET_,
          NOS-.1=NOS.1,NOS-.0=NOS.0,CP-=CP,SMPWT-=WAIT,DLY_POL-=DLY_POL,
          U5.SE-=D,PXL_EN-=PXL_EN);
  U5(U5.DUP-=DUP,CLRSPR_-=CLRSPR_,ENSPR-=ENSPR,U5.LD_-=LD_,
          U5.CI-=CI,CNVEN-=CNVEN,YINCEN-=YINCEN,FIRST-=FC,
          SECOND-=SC,LSTMINUS1-=LC_1,LAST-=LC,REQ-=REQ,YADRSEL-=YADRSEL,
          EOC-=EOC,ENXAU-=ENXAU,CLRXAU-=CLRXAU,U5.SE-=SE,STB-=STB)
```

```
          = XSEQV5FN(U17.Z--CO,U7.Z--RESET_,U3.Z--WAIT,RDY--RDY,
          INC--INC,SPRCYC--SPRCYC,STRT_FLG--STRT_FLG,DLY_POL--DLY_POL,
          CP--CP);
    U1(U1.Z--Z) = OR3B(CS_--C,WR_--B,STRT_FLG--A);


  /* extractors ******************************/


  /* type converters *********************/

ANNOTATIONS
{
  BUS BUS_TYPE = "DOT";
}

END MODULE;


/* * * * * * *  Contents of NET file SPRSEQV2CR.NET  * * * * * * */

/*****************************************************/
/*  Netlist copyright (C) 1989 LSI Logic Corporation  */
/*****************************************************/


MODULE SPRSEQV2CR;

INPUTS      EN,EOCOL,LIM,NS0,NS1,RDY,REQ,STBIT0I,STBIT1I,WAIT;
OUTPUTS     LS_1,SPR0,SPR1,SPRCYC,STBIT0O,STBIT1O;

LEVEL FUNCTION;
DEFINE
  /* implicit connectors *******************/

    SPR1- = (SPR1);
    SPR0- = (SPR0);
    REQ- = (REQ);
    STBIT1I- = (STBIT1I);
    EN- = (EN);
    LIM- = (LIM);
    LS_1- = (LS_1);
    STBIT0I- = (STBIT0I);
    STBIT0O- = (STBIT0O);
    NS0- = (NS0);
    RDY- = (RDY);
    EOCOL- = (EOCOL);
    SPRCYC- = (SPRCYC);
    WAIT- = (WAIT);
    STBIT1O- = (STBIT1O);
    NS1- = (NS1);


  /* part instances **************************/

    M14(M14.Z--Z) = N1C(REQ--A);
    M169(M169.Z--Z) = N1C(M19.Z--A);
    M19(M19.Z--Z) = N1D(STBIT1I--A);
    M81(M81.Z--Z) = ND3B(M50.Z--C,M27.Z--B,M26.Z--A);
    M64(M64.Z--Z) = AND2B(M169.Z--B,M177.Z--A);
    M83(M83.Z--Z) = ND2B(WAIT--A,M169.Z--B);
    M34(M34.Z--Z) = N1C(EN--A);
    M1(M1.Z--Z) = N1C(LIM--A);
    M140(M140.Z--Z) = AND2B(M1.Z--A,WAIT--B);
    M7(M7.Z--Z) = N1C(WAIT--A);
    M6(M6.Z--Z) = AND2C(M1.Z--A,M176.Z--B);
    M27(M27.Z--Z) = AND2C(M7.Z--B,M176.Z--A);
    M176(M176.Z--Z) = N1C(M34.Z--A);
    M10(M10.Z--Z) = N1C(EOCOL--A);
    M177(M177.Z--Z) = N1C(M31.Z--A);
    M138(M138.Z--Z) = ND3B(M137.Z--B,M125.Z--A,M19.Z--C);
    M174(M174.Z--Z) = N1C(M3.Z--A);
```

```
M26(M26.Z-=Z) = AND2C(M1.Z-=B,M174.Z-=A);
M2(M2.Z-=Z) = AND2B(M3.Z-=B,M171.Z-=A);
M20(M20.Z-=Z) = AND3B(M14.Z-=A,M179.Z-=B,M19.Z-=C);
M186(M186.Z-=Z) = AND2B(M96.Z-=B,M92.Z-=A);
M25(M25.Z-=Z) = ND3B(M18.Z-=B,M24.Z-=C,M17.Z-=A);
M179(M179.Z-=Z) = N1C(M28.Z-=A);
M76(M76.Z-=Z) = AND2B(M19.Z-=B,M28.Z-=A);
M28(M28.Z-=Z) = N1D(STBIT0I-=A);
M41(M41.Z-=Z) = AND2C(M1.Z-=B,M171.Z-=A);
M47(M47.Z-=Z) = ND3B(M46.Z-=C,M41.Z-=A,M27.Z-=B);
M42(M42.Z-=Z) = AND2B(M34.Z-=A,M28.Z-=B);
M43(M43.Z-=Z) = ND3B(M41.Z-=A,M42.Z-=B,M19.Z-=C);
M87(M87.Z-=Z) = ND3B(M29.Z-=C,M41.Z-=A,M27.Z-=B);
M29(M29.Z-=Z) = AND3B(M28.Z-=B,M177.Z-=A,M19.Z-=C);
M39(M39.Z-=Z) = AND3B(M28.Z-=B,M177.Z-=A,M169.Z-=C);
M46(M46.Z-=Z) = AND3C(M28.Z-=B,M14.Z-=A,M19.Z-=C);
M96(M96.Z-=Z) = ND3B(M46.Z-=C,M18.Z-=B,M89.Z-=A);
M18(M18.Z-=Z) = AND3C(EOCOL-=A,M176.Z-=B,M7.Z-=C);
M51(M51.Z-=Z) = ND3B(M18.Z-=B,M50.Z-=C,M37.Z-=A);
M40(M40.Z-=Z) = ND3B(M18.Z-=B,M39.Z-=C,M37.Z-=A);
M185(M185.Z-=Z) = AND2B(M51.Z-=B,M40.Z-=A);
M187(LS_1-=Z) = ND3B(M186.Z-=C,M185.Z-=B,M184.Z-=A);
M184(M184.Z-=Z) = AND2B(M25.Z-=B,M21.Z-=A);
M175(M175.Z-=Z) = N1C(M1.Z-=A);
M59(M59.Z-=Z) = ND4B(M175.Z-=A,M10.Z-=B,M179.Z-=C,M169.Z-=D);
M61(M61.Z-=Z) = ND4B(M174.Z-=A,M175.Z-=B,M10.Z-=C,M169.Z-=D);
M11(M11.Z-=Z) = ND3B(M175.Z-=A,M10.Z-=B,M179.Z-=C);
M162(M162.Z-=Z) = NR2B(M160.Z-=A,M161.Z-=B);
M163(STBIT0O-=Z) = ND3B(M156.Z-=A,M162.Z-=C,M159.Z-=B);
M156(M156.Z-=Z) = NR2C(M155.Z-=B,M154.Z-=A);
M154(M154.Z-=Z) = ND2B(M21.Z-=B,M11.Z-=A);
M21(M21.Z-=Z) = ND3B(M18.Z-=B,M20.Z-=C,M17.Z-=A);
M75(M75.Z-=Z) = AND2B(M31.Z-=A,M178.Z-=B);
M178(M178.Z-=Z) = N1C(M14.Z-=A);
M127(M127.Z-=Z) = AND2B(M19.Z-=B,M178.Z-=A);
M115(M115.Z-=Z) = AND3B(M178.Z-=B,M177.Z-=A,M169.Z-=C);
M116(M116.Z-=Z) = ND3B(M115.Z-=C,M114.Z-=B,M17.Z-=A);
M17(M17.Z-=Z) = AND3B(M174.Z-=B,M171.Z-=A,M175.Z-=C);
M171(M171.Z-=Z) = N1C(M36.Z-=A);
M121(M121.Z-=Z) = AND2B(M36.Z-=A,M174.Z-=B);
M36(M36.Z-=Z) = N1C(NS0-=A);
M37(M37.Z-=Z) = AND3B(M174.Z-=B,M175.Z-=C,M36.Z-=A);
M125(M125.Z-=Z) = AND2B(M171.Z-=A,M174.Z-=B);
M128(M128.Z-=Z) = ND3B(M127.Z-=C,M126.Z-=B,M125.Z-=A);
M126(M126.Z-=Z) = AND2B(M31.Z-=B,M1.Z-=A);
M31(M31.Z-=Z) = N1C(RDY-=A);
M32(M32.Z-=Z) = ND3B(M178.Z-=B,M179.Z-=C,M31.Z-=A);
M155(M155.Z-=Z) = ND2B(M25.Z-=A,M32.Z-=B);
M144(M144.Z-=Z) = ND3B(M21.Z-=A,M25.Z-=B,M30.Z-=C);
M146(M146.Z-=Z) = NR2C(M145.Z-=B,M144.Z-=A);
M145(M145.Z-=Z) = ND3B(M47.Z-=A,M60.Z-=C,M59.Z-=B);
M60(M60.Z-=Z) = ND4B(M171.Z-=A,M175.Z-=B,M10.Z-=C,M169.Z-=D);
M114(M114.Z-=Z) = AND3B(M176.Z-=B,M7.Z-=C,M10.Z-=A);
M97(M97.Z-=Z) = AND3B(EOCOL-=B,M174.Z-=A,M176.Z-=C);
M52(M52.Z-=Z) = AND2B(M174.Z-=A,EOCOL-=B);
M104(M104.Z-=Z) = ND3B(M46.Z-=C,M27.Z-=B,M52.Z-=A);
M150(M150.Z-=Z) = ND3B(M96.Z-=A,M100.Z-=B,M104.Z-=C);
M170(M170.Z-=Z) = ND3B(M96.Z-=A,M108.Z-=C,M100.Z-=B);
M100(M100.Z-=Z) = ND3B(M98.Z-=B,M97.Z-=A,M76.Z-=C);
M98(M98.Z-=Z) = AND3B(M7.Z-=A,M178.Z-=C,M177.Z-=B);
M118(M118.Z-=Z) = AND3B(M14.Z-=C,M176.Z-=A,M7.Z-=B);
M111(M111.Z-=Z) = AND2B(M19.Z-=B,M179.Z-=A);
M120(M120.Z-=Z) = ND3B(M118.Z-=B,M109.Z-=A,M111.Z-=C);
M109(M109.Z-=Z) = AND3B(M174.Z-=B,M171.Z-=A,M1.Z-=C);
M137(M137.Z-=Z) = AND2B(M34.Z-=B,M1.Z-=A);
M88(M88.Z-=Z) = ND2B(M34.Z-=A,M169.Z-=B);
M33(M33.Z-=Z) = ND2B(WAIT-=A,M179.Z-=B);
M157(M157.Z-=Z) = ND2B(M33.Z-=A,M35.Z-=B);
M35(M35.Z-=Z) = ND2B(M179.Z-=B,M34.Z-=A);
M142(M142.Z-=Z) = ND4B(M174.Z-=A,M28.Z-=D,M1.Z-=B,M34.Z-=C);
M190(M190.Z-=Z) = NR2B(M188.Z-=A,M189.Z-=B);
M193(M193.Z-=Z) = NR2B(M192.Z-=B,M191.Z-=A);
M197(SPRCYC-=Z) = ND3B(M190.Z-=A,M193.Z-=B,M196.Z-=C);
M196(M196.Z-=Z) = NR2B(M195.Z-=B,M194.Z-=A);
```

```
M195(M195.Z--Z) = ND2B(M142.Z--A,M143.Z--B);
M143(M143.Z--Z) = ND4B(WAIT--C,M174.Z--A,M28.Z--D,M1.Z--B);
M57(M57.Z--Z) = AND2B(M28.Z--B,WAIT--A);
M58(M58.Z--Z) = ND3B(M41.Z--A,M57.Z--B,M19.Z--C);
M189(M189.Z--Z) = ND3B(M43.Z--A,M58.Z--B,M65.Z--C);
M65(M65.Z--Z) = ND3B(M41.Z--A,M27.Z--B,M64.Z--C);
M73(M73.Z--Z) = ND3B(M39.Z--C,M27.Z--B,M26.Z--A);
M160(M160.Z--Z) = ND2B(M73.Z--A,M81.Z--B);
M180(M180.Z--Z) = ND3B(M112.Z--C,M73.Z--A,M81.Z--B);
M112(M112.Z--Z) = ND3B(M110.Z--B,M109.Z--A,M111.Z--C);
M110(M110.Z--Z) = AND3B(M176.Z--A,M7.Z--B,M177.Z--C);
M8(M8.Z--Z) = AND3B(M7.Z--A,M177.Z--B,M179.Z--C);
M24(M24.Z--Z) = AND3B(M177.Z--A,M179.Z--B,M19.Z--C);
M141(M141.Z--Z) = ND3B(M140.Z--B,M125.Z--A,M19.Z--C);
M194(M194.Z--Z) = ND3B(M135.Z--A,M138.Z--B,M141.Z--C);
M135(M135.Z--Z) = ND3B(M15.Z--C,M6.Z--B,M121.Z--A);
M15(M15.Z--Z) = AND3B(M14.Z--B,M7.Z--A,M179.Z--C);
M68(M68.Z--Z) = AND2B(M169.Z--B,M14.Z--A);
M69(M69.Z--Z) = ND3B(M41.Z--A,M27.Z--B,M68.Z--C);
M191(M191.Z--Z) = ND3B(M69.Z--A,M108.Z--C,M77.Z--B);
M77(M77.Z--Z) = ND3B(M41.Z--A,M76.Z--C,M75.Z--B);
M131(M131.Z--Z) = ND3B(M28.Z--C,M26.Z--A,M75.Z--B);
M192(M192.Z--Z) = ND3B(M124.Z--A,M128.Z--B,M131.Z--C);
M124(M124.Z--Z) = ND3B(M8.Z--C,M6.Z--B,M121.Z--A);
M9(M9.Z--Z) = ND3B(M8.Z--C,M6.Z--B,M2.Z--A);
M16(M16.Z--Z) = ND3B(M15.Z--C,M6.Z--B,M2.Z--A);
M188(M188.Z--Z) = ND3B(M9.Z--A,M16.Z--B,M30.Z--C);
M30(M30.Z--Z) = ND3B(M29.Z--C,M27.Z--B,M26.Z--A);
M108(M108.Z--Z) = ND3B(M46.Z--C,M27.Z--B,M26.Z--A);
M151(M151.Z--Z) = ND3B(M112.Z--B,M108.Z--A,M120.Z--C);
M152(M152.Z--Z) = NR2B(M150.Z--A,M151.Z--B);
M153(STBIT10--Z) = ND3B(M146.Z--A,M152.Z--C,M149.Z--B);
M173(SPR0--Z) = ND3B(M146.Z--A,M172.Z--C,M149.Z--B);
M172(M172.Z--Z) = NR2B(M170.Z--A,M161.Z--B);
M161(M161.Z--Z) = ND2B(M112.Z--A,M120.Z--B);
M181(M181.Z--Z) = ND2B(M116.Z--A,M120.Z--B);
M182(M182.Z--Z) = NR2B(M180.Z--A,M181.Z--B);
M183(SPR1--Z) = ND3B(M156.Z--A,M182.Z--C,M159.Z--B);
M159(M159.Z--Z) = NR2C(M158.Z--B,M157.Z--A);
M158(M158.Z--Z) = ND2B(M40.Z--A,M55.Z--B);
M55(M55.Z--Z) = ND3B(M50.Z--C,M27.Z--B,M52.Z--A);
M50(M50.Z--Z) = AND3B(M28.Z--B,M14.Z--A,M169.Z--C);
M82(M82.Z--Z) = ND3B(M178.Z--B,M31.Z--A,M169.Z--C);
M147(M147.Z--Z) = ND3B(M61.Z--A,M83.Z--C,M82.Z--B);
M149(M149.Z--Z) = NR2C(M148.Z--B,M147.Z--A);
M148(M148.Z--Z) = ND3B(M92.Z--C,M87.Z--A,M88.Z--B);
M92(M92.Z--Z) = ND3B(M18.Z--B,M89.Z--A,M29.Z--C);
M89(M89.Z--Z) = AND3B(M171.Z--A,M175.Z--C,M3.Z--B);
M3(M3.Z--Z) = N1C(NS1--A);

/* extractors ******************************/


/* type converters *********************/

ANNOTATIONS
{
 BUS BUS_TYPE = "DOT";
}

END MODULE;


/* * * * * * *  Contents of NET file CNVCNTV4.NET  * * * * * * */

/*******************************************************/
/*  Netlist copyright (C) 1989 LSI Logic Corporation  */
/*******************************************************/


MODULE CNVCNTV4;
```

```
INPUTS        CP,DLY_POL,EOR,INCX,INCY,INT_GT_1IN,MR_CS_,PDI.15,
              PDI.14,PDI.13,PDI.12,PDI.11,PDI.10,PDI.9,PDI.8,PDI.7,
              PDI.6,PDI.5,PDI.4,PDI.3,PDI.2,PDI.1,PDI.0,PXL_EN,RDY,
              RESET_,STOP,STRT,S_MODE,WAIT,WR_,XDIM_CS_,YDIM_CS_,
              YDWN,YUP;
OUTPUTS       CLRXAU,CLRYAU,CMAGEN,DUP,ENXAU,ENYAU,EOC,FRSTROW,HLT,
              LIM,LSTROW,LSTROW_1,LS_1,NOS.1,NOS.0,PSE,REQ,REQ_O,S,
              SCNDCOL,SCNDROW,SE,SPR.1,SPR.0,SPRCYC,STB,STF,YADRSEL,
              YINCEN;

LEVEL FUNCTION;
DEFINE
  /* implicit connectors *******************/

    PXL_EN- = (PXL_EN);
    INT_GT_1IN- = (INT_GT_1IN);
    DLY_POL- = (DLY_POL);
    XDIM_CS_- = (XDIM_CS_);
    INCX- = (INCX);
    SCNDCOL- = (SCNDCOL);
    ENXAU- = (ENXAU);
    CLRXAU- = (CLRXAU);
    PSE- = (PSE);
    STB- = (STB);
    REQ_O- = (REQ_O);
    YADRSEL- = (YADRSEL);
    S- = (S);
    DUP- = (DUP);
    YINCEN- = (YINCEN);
    CMAGEN- = (CMAGEN);
    SE- = (SE);
    YUP- = (YUP);
    YDWN- = (YDWN);
    S_MODE- = (S_MODE);
    ENDCOL- = (ENDCOL);
    ENDCOL- = (ENDCOL);
    REQ- = (REQ);
    REQ- = (REQ);
    RDY- = (RDY);
    RDY- = (RDY);
    ENSPR- = (ENSPR);
    ENSPR- = (ENSPR);
    LS_1- = (LS_1);
    SPRCYC- = (SPRCYC);
    SPR-.1 = (SPR.1);
    SPR-.0 = (SPR.0);
    RESET_- = (RESET_);
    BRESET_- = (BRESET_);
    BRESET_- = (BRESET_);
    STRT- = (STRT);
    STOP- = (STOP);
    STF- = (STF);
    HLT- = (HLT);
    HLT- = (HLT);
    HLT- = (HLT);
    ENYAU- = (ENYAU);
    CLRYAU- = (CLRYAU);
    EOC- = (EOC);
    EOC- = (EOC);
    CP- = (CP);
    WR_- = (WR_);
    MR_CS_- = (MR_CS_);
    BRESET_- = (BRESET_);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
```

```
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
LIM- = (LIM);
LIM- = (LIM);
CLRSPR_- = (CLRSPR_);
CLRSPR_- = (CLRSPR_);
LIM- = (LIM);
LIM- = (LIM);
NOS-.1 = (NOS.1);
NOS-.0 = (NOS.0);
NOS-.1 = (NOS.1);
NOS-.0 = (NOS.0);
MR-.5 = (MR.5);
MR-.4 = (MR.4);
MR-.3 = (MR.3);
MR-.2 = (MR.2);
MR-.1 = (MR.1);
MR-.0 = (MR.0);
MR-.5 = (MR.5);
MR-.4 = (MR.4);
MR-.3 = (MR.3);
MR-.2 = (MR.2);
MR-.1 = (MR.1);
MR-.0 = (MR.0);
MR-.5 = (MR.5);
MR-.4 = (MR.4);
MR-.3 = (MR.3);
MR-.2 = (MR.2);
MR-.1 = (MR.1);
MR-.0 = (MR.0);
WR_- = (WR_);
WR_- = (WR_);
YDIM_CS_- = (YDIM_CS_);
INCY- = (INCY);
EOR- = (EOR);
EOR- = (EOR);
STF- = (STF);
BRESET_- = (BRESET_);
INROW- = (INROW);
INROW- = (INROW);
```

```
INROW- = (INROW);
LSTROW- = (LSTROW);
LSTROW_1- = (LSTROW_1);
SCNDROW- = (SCNDROW);
FRSTROW- = (FRSTROW);
CP- = (CP);
CP- = (CP);
CP- = (CP);
BRESET_- = (BRESET_);
BRESET_- = (BRESET_);
BWAIT- = (BWAIT);
WAIT- = (WAIT);
BWAIT- = (BWAIT);
BWAIT- = (BWAIT);
STF- = (STF);


/* part instances ***************************/

U12(U12.Z-=Z) = N1B(INT_GT_1IN-=A);
U3(U3.Z-=Z) = AND2B(PXL_EN-=A,U12.Z-=B);
U1(BRESET_-=Z) = B3A(RESET_-=A);
U10(U10.Z-=Z) = OR2A(LIM-=B,CLRSPR_-=A);
U9(U9.Z-=Z) = N1A(LIM-=A);
U8.1(NOS-.1=Z) = AND2C(U8.B-.1=B,U9.Z-=A);
U8.0(NOS-.0=Z) = AND2C(U8.B-.0=B,U9.Z-=A);
U0(MR-.5=Q.5,MR-.4=Q.4,MR-.3=Q.3,MR-.2=Q.2,MR-.1=Q.1,MR-.0=Q.0)
        = MR6(MR_CS_-=CS_,BRESET_-=RESET_,WR_-=WR_,U0.D-.5=D.5,
       U0.D-.4=D.4,U0.D-.3=D.3,U0.D-.2=D.2,U0.D-.1=D.1,
       U0.D-.0=D.0);
U5(INROW-=INROW,LSTROW-=LAST,LSTROW_1-=LSTMINUS1,SCNDROW-=SECOND_ROW,
       FRSTROW-=FIRST_ROW) = Y_CNTV3(PDI-.15=PDI.15,PDI-.14=PDI.14,
       PDI-.13=PDI.13,PDI-.12=PDI.12,PDI-.11=PDI.11,PDI-.10=PDI.10,
       PDI-.9=PDI.9,PDI-.8=PDI.8,PDI-.7=PDI.7,PDI-.6=PDI.6,
       PDI-.5=PDI.5,PDI-.4=PDI.4,PDI-.3=PDI.3,PDI-.2=PDI.2,
       PDI-.1=PDI.1,PDI-.0=PDI.0,WR_-=WR_,YDIM_CS_-=CS_,
       INCY-=INC,CP-=CP,EOR-=EOR,STF-=STRT_FLG,BRESET_-=RESET_);
U4(STF-=STF,HLT-=HLT,ENYAU-=ENYAU,CLRYAU-=CLRYAU) = CNVSEQV1FN(
       STRT-=STRT,STOP-=STOP,EOR-=EOR,BRESET_-=RESET_,
       U4.SNGL_CYC-=SNGL_CYC,U4.SNGL_LIN-=SNGL_LIN,
       U4.SNGL_FRM-=SNGL_FRM,EOC-=EOC,CP-=CP);
U7(U7.Z-=Z) = AND2B(U10.Z-=B,BRESET_-=A);
U6(LS_1-=LS_1,SPRCYC-=SPRCYC,SPR-.1=SPR.1,SPR-.0=SPR.0) =
       SPRSEQV2FN(LIM-=LIM,ENDCOL-=ENDCOL,INROW-=INROW,REQ-=REQ,
       RDY-=RDY,HLT-=HLT,BWAIT-=WAIT,ENSPR-=EN,CP-=CP,
       U8.B-.1=NS.1,U8.B-.0=NS.0,U7.Z-=RESET_);
U11(BWAIT-=Z) = B3A(WAIT-=A);
U2(CLRSPR_-=CLRSPR_,ENSPR-=ENSPR,SCNDCOL-=SECOND,EOC-=EOC,
       ENXAU-=ENXAU,CLRXAU-=CLRXAU,PSE-=PSE,REQ-=REQ,STB-=STB,
       REQ_O-=REQ_O,YADRSEL-=YADRSEL,S-=S,DUP-=DUP,YINCEN-=YINCEN,
       CMAGEN-=CMAGEN,SE-=SE,ENDCOL-=LAST) = X_CNTV5(U3.Z-=PXL_EN,
       DLY_POL-=DLY_POL,STF-=STRT_FLG,XDIM_CS_-=CS_,RDY-=RDY,
       INCX-=INC,WR_-=WR_,HLT-=HLT,INROW-=INROW,CP-=CP,
       PDI-.15=PDI.15,PDI-.14=PDI.14,PDI-.13=PDI.13,PDI-.12=PDI.12,
       PDI-.11=PDI.11,PDI-.10=PDI.10,PDI-.9=PDI.9,PDI-.8=PDI.8,
       PDI-.7=PDI.7,PDI-.6=PDI.6,PDI-.5=PDI.5,PDI-.4=PDI.4,
       PDI-.3=PDI.3,PDI-.2=PDI.2,PDI-.1=PDI.1,PDI-.0=PDI.0,
       BRESET_-=RESET_,YUP-=YUP,YDWN-=YDWN,SPRCYC-=SPRCYC,
       NOS-.1=NOS.1,NOS-.0=NOS.0,S_MODE-=S_MODE,BWAIT-=WAIT);


/* extractors ******************************/

PDI-.5 = (U0.D-.5);
PDI-.4 = (U0.D-.4);
PDI-.3 = (U0.D-.3);
PDI-.2 = (U0.D-.2);
PDI-.1 = (U0.D-.1);
PDI-.0 = (U0.D-.0);
MR-.5 = (LIM-);
MR-.4 = (U8.B-.1);
MR-.3 = (U8.B-.0);
M-0.2 = (U4.SNGL_CYC-);
M-0.0 = (U4.SNGL_FRM-);
```

```
    M-0.1 = (U4.SNGL_LIN-);
    MR-.2 = (M-0.2);
    MR-.1 = (M-0.1);
    MR-.0 = (M-0.0);


  /* type converters *********************/

ANNOTATIONS
{
  BUS BUS_TYPE = "DOT";
}

END MODULE;


/* * * * * * *  Contents of NET file SPRSEQV2FN.NET  * * * * * * */

/*******************************************************/
/*  Netlist copyright (C) 1989 LSI Logic Corporation   */
/*******************************************************/


MODULE SPRSEQV2FN;

INPUTS      CP,EN,ENDCOL,HLT,INROW,LIM,NS.1,NS.0,RDY,REQ,RESET_,
            WAIT;
OUTPUTS     LS_1,SPR.1,SPR.0,SPRCYC;

LEVEL FUNCTION;
DEFINE
  /* implicit connectors *******************/

    LIM- = (LIM);
    LIM- = (LIM);
    ENDCOL- = (ENDCOL);
    EN- = (EN);
    REQ- = (REQ);
    WAIT- = (WAIT);
    HLT- = (HLT);
    INROW- = (INROW);
    RESET_- = (RESET_);
    SPR-.1 = (SPR.1);
    SPR-.0 = (SPR.0);
    LS_1- = (LS_1);
    RESET_- = (RESET_);
    CP- = (CP);
    CP- = (CP);
    CP- = (CP);
    RDY- = (RDY);
    NS-.1 = (NS.1);
    NS-.0 = (NS.0);
    NS-.1 = (NS.1);
    NS-.0 = (NS.0);
    RESET_- = (RESET_);
    RESET_- = (RESET_);
    SPRCYC- = (SPRCYC);


  /* part instances **************************/

    U1(U1.Z-=Z) = N1A(INROW-=A);
    U2(U2.Z-=Z) = OR3C(WAIT-=A,HLT-=B,U1.Z-=C);
    U4(U4.Q-=Q) = FD2A(U0.STBIT0O-=D,RESET_-=CD,CP-=CP);
    U5.2(U5.Q-.2=Q) = FD2A(RESET_-=CD,U5.D-.2=D,CP-=CP);
    U5.1(U5.Q-.1=Q) = FD2A(RESET_-=CD,U5.D-.1=D,CP-=CP);
    U5.0(U5.Q-.0=Q) = FD2A(RESET_-=CD,U5.D-.0=D,CP-=CP);
    U3(U3.Q-=Q) = FD2A(U0.STBIT1O-=D,RESET_-=CD,CP-=CP);
    U0(U0.LS_1-=LS_1,U0.SPR0-=SPR0,U0.SPR1-=SPR1,U0.STBIT1O-=STBIT1O,
            U0.STBIT0O-=STBIT0O,U0.SPRCYC-=SPRCYC) = SPRSEQV2CR(
            LIM-=LIM,ENDCOL-=EOCOL,EN-=EN,REQ-=REQ,U0.NS0-=NS0,
            U0.NS1-=NS1,U2.Z-=WAIT,U4.Q-=STBIT0I,U3.Q-=STBIT1I,
            RDY-=RDY);
```

```
    U8(U8.Z-=Z) = OR2A(U8.A-=A,U8.B-=B);
    U7(U7.Z-=Z) = N1A(U8.Z-=A);
    U11(U11.Z-=Z) = OR2A(RESET_-=B,U8.Z-=A);
    U10(U10.Z-=Z) = OR3A(LIM-=B,U7.Z-=C,RESET_-=A);
    U9(SPRCYC-=Q) = FD3A(U0.SPRCYC-=D,CP-=CP,U11.Z-=CD,U10.Z-=SD);


  /* extractors ******************************/

    NS-.0 = (U8.A-);
    NS-.1 = (U0.NS1-);
    U5.Q-.2 = (SPR-.1);
    U5.Q-.1 = (SPR-.0);
    U5.Q-.0 = (LS_1-);
    U5.D-.0 = (U0.LS_1-);
    U5.D-.1 = (U0.SPR0-);
    U5.D-.2 = (U0.SPR1-);
    NS-.0 = (U0.NS0-);
    NS-.1 = (U8.B-);


  /* type converters *********************/

ANNOTATIONS
{
  BUS BUS_TYPE = "DOT";
}

END MODULE;



/* * * * * * *  Contents of NET file PSDV2FN.NET  * * * * * * */

/*******************************************************/
/*  Netlist copyright (C) 1989 LSI Logic Corporation   */
/*******************************************************/

MODULE PSDV2FN;

INPUTS      CP,EOC,P1_BUSY,RESET_,SC,SE,S_MODE;
OUTPUTS     DLY_POL;

LEVEL FUNCTION;
DEFINE
  /* implicit connectors *******************/

    EOC- = (EOC);
    P1_BUSY- = (P1_BUSY);
    SE- = (SE);
    DLY_POL- = (DLY_POL);
    CP- = (CP);
    CP- = (CP);
    S_MODE- = (S_MODE);
    BRESET_- = (BRESET_);
    RESET_- = (RESET_);
    BRESET_- = (BRESET_);
    BRESET_- = (BRESET_);
    SC- = (SC);


  /* part instances **************************/

    U6(U6.Q-=Q) = FD2A(CP-=CP,BRESET_-=CD,U0.STBIT0O-=D);
    U1(DLY_POL-=Q) = FD2A(U0.DLY_POL-=D,CP-=CP,U4.Z-=CD);
    U7(U7.Z-=Z) = N1A(S_MODE-=A);
    U4(U4.Z-=Z) = AND2B(BRESET_-=A,U7.Z-=B);
    U3(U3.Z-=Z) = N1A(RESET_-=A);
    U2(BRESET_-=Z) = N1B(U3.Z-=A);
    U5(U5.Q-=Q) = FD2A(CP-=CP,BRESET_-=CD,U0.STBIT1O-=D);
    U0(U0.DLY_POL-=DLY_POL,U0.STBIT0O-=STBIT0O,U0.STBIT1O-=STBIT1O)
            = PSDV2CR(SC-=SC,EOC-=EOC,P1_BUSY-=P1_BUSY,SE-=SE,
           U6.Q-=STBIT0I,U5.Q-=STBIT1I);
```

```
  /* extractors ******************************/


  /* type converters *********************/

ANNOTATIONS
{
  BUS BUS_TYPE = "DOT";
}

END MODULE;


/* * * * * * *  Contents of NET file PSDV2CR.NET  * * * * * * */

/*****************************************************/
/*  Netlist copyright (C) 1989 LSI Logic Corporation  */
/*****************************************************/


MODULE PSDV2CR;

INPUTS      EOC,P1_BUSY,SC,SE,STBIT0I,STBIT1I;
OUTPUTS     DLY_POL,STBIT0O,STBIT1O;
LEVEL FUNCTION;
DEFINE
  /* implicit connectors *******************/

    STBIT1O- = (STBIT1O);
    STBIT0O- = (STBIT0O);
    P1_BUSY- = (P1_BUSY);
    DLY_POL- = (DLY_POL);
    STBIT0I- = (STBIT0I);
    SC- = (SC);
    SE- = (SE);
    STBIT1I- = (STBIT1I);
    EOC- = (EOC);

  /* part instances ***************************/

    M9(M9.Z-=Z) = ND4B(P1_BUSY-=C,STBIT0I-=D,M1.Z-=A,M3.Z-=B);
    M15(DLY_POL-=Z) = ND2B(M2.Z-=A,M9.Z-=B);
    M14(STBIT0O-=Z) = ND4B(M2.Z-=A,M7.Z-=B,M9.Z-=D,M8.Z-=C);
    M8(M8.Z-=Z) = ND3B(M3.Z-=B,SE-=A,STBIT0I-=C);
    M10(M10.Z-=Z) = N1B(STBIT0I-=A);
    M11(M11.Z-=Z) = N1B(STBIT1I-=A);
    M12(M12.Z-=Z) = ND3B(M10.Z-=B,M11.Z-=C,SC-=A);
    M13(STBIT1O-=Z) = ND4B(M2.Z-=A,M6.Z-=B,M9.Z-=C,M12.Z-=D);
    M6(M6.Z-=Z) = ND3B(M3.Z-=B,M1.Z-=A,STBIT1I-=C);
    M1(M1.Z-=Z) = N1B(SE-=A);
    M7(M7.Z-=Z) = ND3B(M3.Z-=B,SE-=A,STBIT1I-=C);
    M2(M2.Z-=Z) = ND3B(M3.Z-=A,STBIT0I-=B,STBIT1I-=C);
    M3(M3.Z-=Z) = N1C(EOC-=A);

  /* extractors ******************************/


  /* type converters *********************/

ANNOTATIONS
{
  BUS BUS_TYPE = "DOT";
}

END MODULE;


/* * * * * * *  Contents of NET file INCR3_INC3.NET  * * * * * * */
```

```
/*******************************************************/
/*  Netlist copyright (C) 1989 LSI Logic Corporation  */
/*******************************************************/


MODULE INCR3_INC3;

INPUTS      A0,A1,A2,CIN;
OUTPUTS     Y0,Y1,Y2;

LEVEL FUNCTION;
DEFINE
  /* implicit connectors ******************/

    Y0- = (Y0);
    A0- = (A0);
    Y1- = (Y1);
    CIN- = (CIN);
    A2- = (A2);
    Y2- = (Y2);
    A1- = (A1);


  /* part instances *************************/

    M___5(Y0-=Z) = EOC(M___1.Z-=A,A0-=B);
    M___6(Y1-=Z) = ENC(M___2.Z-=A,A1-=B);
    M___2(M___2.Z-=Z) = ND2B(A0-=B,M___1.Z-=A);
    M___1(M___1.Z-=Z) = B3A(CIN-=A);
    M___7(Y2-=Z) = ENC(A2-=B,M___3.Z-=A);
    M___3(M___3.Z-=Z) = ND3B(A0-=B,A1-=C,M___1.Z-=A);


  /* extractors *****************************/


  /* type converters ********************/

ANNOTATIONS
{
  BUS BUS_TYPE = "DOT";
}

END MODULE;


/* * * * * * *  Contents of NET file MR5.NET  * * * * * * */

/*******************************************************/
/*  Netlist copyright (C) 1989 LSI Logic Corporation  */
/*******************************************************/


MODULE MR5;

INPUTS      CS_,D.4,D.3,D.2,D.1,D.0,RESET_,WR_;
OUTPUTS     Q.4,Q.3,Q.2,Q.1,Q.0;

LEVEL FUNCTION;
DEFINE
  /* implicit connectors ******************/

    WR_- = (WR_);
    CS_- = (CS_);
    D-.4 = (D.4);
    D-.3 = (D.3);
    D-.2 = (D.2);
    D-.1 = (D.1);
    D-.0 = (D.0);
    RESET_- = (RESET_);
    Q-.4 = (Q.4);
    Q-.3 = (Q.3);
```

```
    Q-.2 = (Q.2);
    Q-.1 = (Q.1);
    Q-.0 = (Q.0);

  /* part instances **************************/

    U0(U0.Z-=Z) = OR2B(WR_-=B,CS_-=A);
    U1.4(Q-.4=Q) = FD2A(U0.Z-=CP,D-.4=D,RESET_-=CD);
    U1.3(Q-.3=Q) = FD2A(U0.Z-=CP,D-.3=D,RESET_-=CD);
    U1.2(Q-.2=Q) = FD2A(U0.Z-=CP,D-.2=D,RESET_-=CD);
    U1.1(Q-.1=Q) = FD2A(U0.Z-=CP,D-.1=D,RESET_-=CD);
    U1.0(Q-.0=Q) = FD2A(U0.Z-=CP,D-.0=D,RESET_-=CD);


  /* extractors ******************************/


  /* type converters *********************/

ANNOTATIONS
{
  BUS BUS_TYPE = "DOT";
}

END MODULE;


/* * * * * * *  Contents of NET file INCR3.NET  * * * * * * */

/*******************************************************/
/*  Netlist copyright (C) 1989 LSI Logic Corporation   */
/*******************************************************/


MODULE INCR3;

INPUTS      A.2,A.1,A.0,CIN,EN;
OUTPUTS     Y.2,Y.1,Y.0;

LEVEL FUNCTION;
DEFINE
  /* implicit connectors *******************/

    CIN- = (CIN);
    EN- = (EN);
    A-.2 = (A.2);
    A-.1 = (A.1);
    A-.0 = (A.0);
    Y-.2 = (Y.2);
    Y-.1 = (Y.1);
    Y-.0 = (Y.0);


  /* part instances **************************/

    U1(U1.Z-=Z) = AND2B(CIN-=A,EN-=B);
    M___1(M___1.Y1-=Y1,M___1.Y2-=Y2,M___1.Y0-=Y0) = INCR3_INC3(U1.Z-=CIN,
            M___1.A0-=A0,M___1.A1-=A1,M___1.A2-=A2);

  /* extractors ******************************/

    Y-.2 = (M___1.Y2-);
    Y-.0 = (M___1.Y0-);
    A-.1 = (M___1.A1-);
    A-.0 = (M___1.A0-);
    A-.2 = (M___1.A2-);
    Y-.1 = (M___1.Y1-);


  /* type converters *********************/
```

```
ANNOTATIONS
{
  BUS BUS_TYPE = "DOT";
}

END MODULE;


/* * * * * * *  Contents of NET file YAUCNTV4CR.NET  * * * * * * */

/*****************************************************/
/*  Netlist copyright (C) 1989 LSI Logic Corporation  */
/*****************************************************/


MODULE YAUCNTV4CR;

INPUTS       CLRYAU,ENYAU,FR,LIM,LR,LR_1,LS_1,SR,STBIT0I,STBIT1I,
             STBIT2I,YINCEN,YINT,YINT_1;
OUTPUTS      CE,CLD,CLRCNT,DCR,EOR,HLD,INCY,RLD,RST,STBIT0O,
             STBIT1O,STBIT2O,YINTSND;

LEVEL FUNCTION;
DEFINE
  /* implicit connectors *******************/

    YINTSND- = (YINTSND);
    DCR- = (DCR);
    EOR- = (EOR);
    RST- = (RST);
    CLRCNT- = (CLRCNT);
    STBIT2I- = (STBIT2I);
    CLD- = (CLD);
    STBIT1O- = (STBIT1O);
    LR- = (LR);
    YINT- = (YINT);
    STBIT0I- = (STBIT0I);
    SR- = (SR);
    INCY- = (INCY);
    LR_1- = (LR_1);
    RLD- = (RLD);
    HLD- = (HLD);
    ENYAU- = (ENYAU);
    YINT_1- = (YINT_1);
    STBIT1I- = (STBIT1I);
    CLRYAU- = (CLRYAU);
    STBIT0O- = (STBIT0O);
    CE- = (CE);
    LS_1- = (LS_1);
    YINCEN- = (YINCEN);
    LIM- = (LIM);
    STBIT2O- = (STBIT2O);
    FR- = (FR);


  /* part instances **************************/

    M9(M9.Z-=Z) = N1C(STBIT2I-=A);
    M18(M18.Z-=Z) = N1C(LR-=A);
    M2(M2.Z-=Z) = N1D(STBIT0I-=A);
    M133(M133.Z-=Z) = N1C(M9.Z-=A);
    M15(M15.Z-=Z) = N1C(SR-=A);
    M129(M129.Z-=Z) = N1C(M2.Z-=A);
    M51(M51.Z-=Z) = N1B(YINT-=A);
    M57(M57.Z-=Z) = AND2C(M12.Z-=A,M129.Z-=B);
    M16(M16.Z-=Z) = N1C(LR_1-=A);
    M100(M100.Z-=Z) = AND2B(LR_1-=B,M12.Z-=A);
    M189(RLD-=Z) = ND3B(M55.Z-=A,M116.Z-=C,M72.Z-=B);
    M37(M37.Z-=Z) = AND2C(M12.Z-=B,M36.Z-=A);
    M36(M36.Z-=Z) = N1C(ENYAU-=A);
    M128(M128.Z-=Z) = N1C(M36.Z-=A);
    M136(M136.Z-=Z) = ND4B(M12.Z-=B,M36.Z-=A,M130.Z-=D,M2.Z-=C);
    M145(M145.Z-=Z) = AND2B(M135.Z-=A,M136.Z-=B);
```

```
M58(M58.Z-=Z) = AND2B(M130.Z-=A,M9.Z-=B);
M131(M131.Z-=Z) = ND3B(M69.Z-=A,M58.Z-=C,M57.Z-=B);
M69(M69.Z-=Z) = AND2B(M68.Z-=A,M128.Z-=B);
M68(M68.Z-=Z) = N1B(YINT_1-=A);
M56(M56.Z-=Z) = AND2B(YINT_1-=A,M128.Z-=B);
M71(M71.Z-=Z) = AND2C(M9.Z-=B,M7.Z-=A);
M7(M7.Z-=Z) = N1D(STBIT1I-=A);
M12(M12.Z-=Z) = N1D(CLRYAU-=A);
M73(M73.Z-=Z) = ND4B(CLRYAU-=A,M130.Z-=C,M2.Z-=B,M133.Z-=D);
M11(M11.Z-=Z) = ND3B(CLRYAU-=A,M129.Z-=B,M7.Z-=C);
M130(M130.Z-=Z) = N1C(M7.Z-=A);
M175(CE-=Z) = ND4B(M22.Z-=A,M35.Z-=B,M84.Z-=C,M88.Z-=D);
M147(M147.Z-=Z) = AND2B(M22.Z-=A,M35.Z-=B);
M150(STBIT0O-=Z) = ND3B(M148.Z-=B,M147.Z-=A,M149.Z-=C);
M148(M148.Z-=Z) = AND2B(M62.Z-=A,M80.Z-=B);
M157(M157.Z-=Z) = ND3B(M31.Z-=C,M10.Z-=A,M11.Z-=B);
M159(M159.Z-=Z) = NR2B(M158.Z-=B,M157.Z-=A);
M158(M158.Z-=Z) = ND2B(M62.Z-=B,M59.Z-=A);
M62(M62.Z-=Z) = ND3C(M45.Z-=B,M133.Z-=C,M37.Z-=A);
M38(M38.Z-=Z) = AND2B(M130.Z-=B,M2.Z-=A);
M77(M77.Z-=Z) = ND3C(M44.Z-=A,M38.Z-=B,M9.Z-=C);
M44(M44.Z-=Z) = AND2B(M12.Z-=B,M128.Z-=A);
M151(M151.Z-=Z) = AND3B(M35.Z-=A,M43.Z-=B,M46.Z-=C);
M181(M181.Z-=Z) = ND2B(M35.Z-=A,M43.Z-=B);
M168(M168.Z-=Z) = ND2B(M43.Z-=A,M46.Z-=B);
M46(M46.Z-=Z) = ND3B(M45.Z-=B,M44.Z-=A,M133.Z-=C);
M80(M80.Z-=Z) = ND3B(M45.Z-=B,M9.Z-=C,M37.Z-=A);
M45(M45.Z-=Z) = AND2B(M129.Z-=A,M7.Z-=B);
M27(M27.Z-=Z) = N1C(LIM-=A);
M4(M4.Z-=Z) = N1B(YINCEN-=A);
M141(M141.Z-=Z) = AND2B(M89.Z-=A,M98.Z-=B);
M89(M89.Z-=Z) = ND4B(M2.Z-=B,M4.Z-=A,M133.Z-=D,M7.Z-=C);
M137(M137.Z-=Z) = ND3B(M130.Z-=B,M2.Z-=A,M9.Z-=C);
M164(M164.Z-=Z) = ND2B(M137.Z-=A,M138.Z-=B);
M138(M138.Z-=Z) = ND3B(M2.Z-=B,M4.Z-=A,M7.Z-=C);
M8(M8.Z-=Z) = ND3B(M1.Z-=B,M3.Z-=A,M7.Z-=C);
M3(M3.Z-=Z) = AND2B(LIM-=B,M4.Z-=A);
M120(M120.Z-=Z) = AND2B(LIM-=B,YINCEN-=A);
M94(M94.Z-=Z) = ND4B(YINCEN-=A,M2.Z-=B,M133.Z-=D,M7.Z-=C);
M191(M191.Z-=Z) = AND2B(M94.Z-=A,M124.Z-=B);
M124(M124.Z-=Z) = ND3B(M122.Z-=B,M120.Z-=A,M71.Z-=C);
M122(M122.Z-=Z) = AND2B(M121.Z-=A,M2.Z-=B);
M121(M121.Z-=Z) = N1B(LS_1-=A);
M1(M1.Z-=Z) = AND2B(LS_1-=A,M2.Z-=B);
M127(M127.Z-=Z) = ND3B(M120.Z-=A,M1.Z-=B,M7.Z-=C);
M132(M132.Z-=Z) = ND4B(YINT_1-=A,M12.Z-=B,M129.Z-=C,M7.Z-=D);
M149(M149.Z-=Z) = AND3B(M135.Z-=C,M112.Z-=A,M132.Z-=B);
M110(M110.Z-=Z) = AND3B(M12.Z-=A,M2.Z-=C,M18.Z-=B);
M112(M112.Z-=Z) = ND3B(M111.Z-=C,M110.Z-=B,M81.Z-=A);
M111(M111.Z-=Z) = AND2B(M130.Z-=A,M133.Z-=B);
M134(M134.Z-=Z) = AND2B(M129.Z-=A,M130.Z-=B);
M135(M135.Z-=Z) = ND3B(M134.Z-=B,M9.Z-=C,M37.Z-=A);
M39(M39.Z-=Z) = ND3B(M38.Z-=B,M133.Z-=C,M37.Z-=A);
M139(M139.Z-=Z) = AND2B(M8.Z-=A,M39.Z-=B);
M142(STBIT2O-=Z) = ND3B(M141.Z-=C,M140.Z-=B,M139.Z-=A);
M140(M140.Z-=Z) = AND2B(M62.Z-=A,M77.Z-=B);
M171(M171.Z-=Z) = ND2B(M80.Z-=B,M77.Z-=A);
M161(M161.Z-=Z) = ND2B(M124.Z-=B,M80.Z-=A);
M162(M162.Z-=Z) = NR2B(M161.Z-=B,M160.Z-=A);
M166(HLD-=Z) = ND3B(M159.Z-=A,M162.Z-=B,M165.Z-=C);
M165(M165.Z-=Z) = NR2B(M164.Z-=B,M163.Z-=A);
M163(M163.Z-=Z) = ND2B(M135.Z-=A,M136.Z-=B);
M154(M154.Z-=Z) = ND2B(M136.Z-=B,M131.Z-=A);
M187(M187.Z-=Z) = AND3B(M116.Z-=B,M108.Z-=A,M131.Z-=C);
M116(M116.Z-=Z) = ND3C(M114.Z-=B,M92.Z-=C,M81.Z-=A);
M114(M114.Z-=Z) = AND3B(LR_1-=B,M12.Z-=A,M27.Z-=C);
M14(M14.Z-=Z) = N1C(FR-=A);
M17(M17.Z-=Z) = AND3B(M14.Z-=A,M15.Z-=B,M16.Z-=C);
M66(M66.Z-=Z) = ND3B(M64.Z-=B,M30.Z-=C,M13.Z-=A);
M64(M64.Z-=Z) = AND3B(M14.Z-=A,M18.Z-=C,M16.Z-=B);
M24(M24.Z-=Z) = ND2B(M12.Z-=A,M14.Z-=B);
M33(M33.Z-=Z) = AND2B(LIM-=B,M12.Z-=A);
M55(M55.Z-=Z) = ND3B(M52.Z-=A,M33.Z-=B,M30.Z-=C);
M52(M52.Z-=Z) = AND2B(M51.Z-=A,M128.Z-=B);
```

```
M74(M74.Z--Z) = ND3B(M130.Z--C,M51.Z--A,M2.Z--B);
M160(M160.Z--Z) = ND3B(M72.Z--A,M73.Z--B,M74.Z--C);
M72(M72.Z--Z) = ND3B(M69.Z--A,M71.Z--C,M57.Z--B);
M88(M88.Z--Z) = ND3B(M71.Z--C,M86.Z--B,M81.Z--A);
M86(M86.Z--Z) = AND3B(M12.Z--A,M129.Z--C,M16.Z--B);
M82(M82.Z--Z) = AND3B(LIM--B,M12.Z--A,M129.Z--C);
M84(M84.Z--Z) = ND3B(M71.Z--C,M82.Z--B,M81.Z--A);
M173(M173.Z--Z) = AND3B(M116.Z--C,M84.Z--A,M88.Z--B);
M185(M185.Z--Z) = ND2B(M84.Z--A,M88.Z--B);
M184(M184.Z--Z) = ND2B(M59.Z--A,M66.Z--B);
M186(M186.Z--Z) = NR2B(M185.Z--B,M184.Z--A);
M188(INCY--Z) = ND3B(M187.Z--C,M183.Z--A,M186.Z--B);
M183(M183.Z--Z) = NR2B(M181.Z--A,M182.Z--B);
M182(M182.Z--Z) = ND2B(M50.Z--B,M46.Z--A);
M50(M50.Z--Z) = ND3B(M48.Z--B,M30.Z--C,M13.Z--A);
M48(M48.Z--Z) = AND3B(M15.Z--A,M18.Z--C,M16.Z--B);
M105(M105.Z--Z) = ND2B(M2.Z--B,M16.Z--A);
M26(M26.Z--Z) = ND2B(M15.Z--A,M16.Z--B);
M104(M104.Z--Z) = AND3B(M12.Z--A,M14.Z--B,M15.Z--C);
M108(M108.Z--Z) = ND3B(M104.Z--B,M81.Z--A,M107.Z--C);
M107(M107.Z--Z) = NR2B(M105.Z--A,M20.Z--B);
M20(M20.Z--Z) = ND2B(M130.Z--A,M133.Z--B);
M30(M30.Z--Z) = AND3C(M130.Z--B,M2.Z--A,M133.Z--C);
M101(M101.Z--Z) = AND3B(M130.Z--C,M2.Z--B,M27.Z--A);
M102(M102.Z--Z) = ND3B(M100.Z--B,M99.Z--A,M101.Z--C);
M99(M99.Z--Z) = AND2B(YINT_1--B,YINT--A);
M32(M32.Z--Z) = AND2B(YINT--A,M128.Z--B);
M23(M23.Z--Z) = ND2B(YINT--A,M128.Z--B);
M25(M25.Z--Z) = NR2B(M24.Z--B,M23.Z--A);
M31(M31.Z--Z) = ND3C(M30.Z--C,M29.Z--B,M25.Z--A);
M29(M29.Z--Z) = NR2B(M28.Z--B,M26.Z--A);
M28(M28.Z--Z) = ND2B(LR--A,M27.Z--B);
M67(M67.Z--Z) = ND4B(YINCEN--A,M2.Z--C,M7.Z--D,M27.Z--B);
M143(M143.Z--Z) = AND3B(M94.Z--C,M77.Z--B,M67.Z--A);
M146(STBIT10--Z) = ND3B(M145.Z--C,M144.Z--B,M143.Z--A);
M144(M144.Z--Z) = AND3B(M116.Z--B,M102.Z--A,M127.Z--C);
M192(CLD--Z) = ND3B(M191.Z--B,M190.Z--A,M127.Z--C);
M190(M190.Z--Z) = AND2B(M55.Z--A,M93.Z--B);
M93(M93.Z--Z) = ND3B(M69.Z--A,M33.Z--B,M92.Z--C);
M92(M92.Z--Z) = AND3B(M129.Z--A,M9.Z--C,M7.Z--B);
M10(M10.Z--Z) = ND3B(CLRYAU--A,M129.Z--B,M9.Z--C);
M177(M177.Z--Z) = AND2B(M10.Z--A,M11.Z--B);
M180(CLRCNT--Z) = ND3B(M10.Z--A,M11.Z--B,M73.Z--C);
M179(RST--Z) = ND3B(M178.Z--B,M177.Z--A,M73.Z--C);
M178(M178.Z--Z) = AND2B(M31.Z--A,M59.Z--B);
M176(EOR--Z) = ND2B(M31.Z--A,M59.Z--B);
M59(M59.Z--Z) = ND3C(M58.Z--C,M56.Z--A,M57.Z--B);
M119(M119.Z--Z) = ND3B(M99.Z--A,M7.Z--C,M57.Z--B);
M153(M153.Z--Z) = ND2B(M77.Z--A,M119.Z--B);
M155(M155.Z--Z) = NR2B(M154.Z--B,M153.Z--A);
M156(DCR--Z) = ND3B(M152.Z--B,M151.Z--A,M155.Z--C);
M152(M152.Z--Z) = AND3B(M62.Z--B,M50.Z--A,M66.Z--C);
M170(M170.Z--Z) = ND2B(M50.Z--A,M66.Z--B);
M172(M172.Z--Z) = NR2B(M171.Z--B,M170.Z--A);
M174(YINTSND--Z) = ND3B(M173.Z--C,M169.Z--A,M172.Z--B);
M169(M169.Z--Z) = NR2B(M168.Z--B,M167.Z--A);
M167(M167.Z--Z) = ND2B(M31.Z--A,M35.Z--B);
M35(M35.Z--Z) = ND3C(M33.Z--B,M32.Z--A,M30.Z--C);
M43(M43.Z--Z) = ND3B(M41.Z--B,M30.Z--C,M13.Z--A);
M41(M41.Z--Z) = AND3B(M14.Z--A,M15.Z--B,M18.Z--C);
M19(M19.Z--Z) = ND2B(M2.Z--B,M18.Z--A);
M21(M21.Z--Z) = NR2B(M20.Z--B,M19.Z--A);
M22(M22.Z--Z) = ND3B(M17.Z--B,M13.Z--A,M21.Z--C);
M13(M13.Z--Z) = AND3C(YINT--A,M12.Z--C,M128.Z--B);
M81(M81.Z--Z) = AND3C(YINT_1--B,YINT--A,M128.Z--C);
M98(M98.Z--Z) = ND3B(M38.Z--C,M96.Z--B,M81.Z--A);
M96(M96.Z--Z) = AND3B(FR--B,M12.Z--A,M27.Z--C);


/* extractors ******************************/


/* type converters *********************/
```

```
ANNOTATIONS
{
  BUS BUS_TYPE = "DOT";
}

END MODULE;


/* * * * * * *  Contents of NET file CNT3UDCR.NET  * * * * * * */

/*****************************************************/
/*  Netlist copyright (C) 1989 LSI Logic Corporation  */
/*****************************************************/


MODULE CNT3UDCR;

INPUTS      CD,CU,STBIT0I,STBIT1I,STBIT2I;
OUTPUTS     BR,CO,STBIT0O,STBIT1O,STBIT2O;

LEVEL FUNCTION;
DEFINE
  /* implicit connectors *******************/

    STBIT2O- = (STBIT2O);
    STBIT2I- = (STBIT2I);
    STBIT0O- = (STBIT0O);
    BR- = (BR);
    STBIT1I- = (STBIT1I);
    CU- = (CU);
    STBIT1O- = (STBIT1O);
    STBIT0I- = (STBIT0I);
    CO- = (CO);
    CD- = (CD);


  /* part instances ************************/

    M8(M8.Z-=Z) = N1C(STBIT2I-=A);
    M40(M40.Z-=Z) = N1C(M8.Z-=A);
    M42(M42.Z-=Z) = N1C(M3.Z-=A);
    M39(BR-=Z) = N1B(M17.Z-=A);
    M2(M2.Z-=Z) = N1C(STBIT1I-=A);
    M19(M19.Z-=Z) = N1C(M7.Z-=A);
    M7(M7.Z-=Z) = N1C(CU-=A);
    M10(M10.Z-=Z) = ND3B(M7.Z-=A,M3.Z-=B,M40.Z-=C);
    M41(M41.Z-=Z) = N1C(M2.Z-=A);
    M23(M23.Z-=Z) = ND3B(M3.Z-=A,M41.Z-=B,M8.Z-=C);
    M24(M24.Z-=Z) = ND3B(STBIT0I-=B,M42.Z-=A,M40.Z-=C);
    M36(M36.Z-=Z) = AND2B(M26.Z-=A,M28.Z-=B);
    M28(M28.Z-=Z) = ND3B(STBIT0I-=C,M7.Z-=A,M3.Z-=B);
    M38(CO-=Z) = N1B(M13.Z-=A);
    M11(M11.Z-=Z) = AND2B(M19.Z-=A,M3.Z-=B);
    M13(M13.Z-=Z) = ND3B(M12.Z-=B,M11.Z-=A,M40.Z-=C);
    M12(M12.Z-=Z) = AND2B(STBIT0I-=A,M41.Z-=B);
    M15(M15.Z-=Z) = N1B(STBIT0I-=A);
    M20(M20.Z-=Z) = AND2B(M15.Z-=A,M41.Z-=B);
    M27(M27.Z-=Z) = ND3B(M19.Z-=A,M42.Z-=B,M41.Z-=C);
    M32(M32.Z-=Z) = AND2B(M23.Z-=A,M27.Z-=B);
    M33(STBIT1O-=Z) = ND3B(M32.Z-=B,M31.Z-=A,M29.Z-=C);
    M29(M29.Z-=Z) = ND3B(M7.Z-=A,M41.Z-=B,M40.Z-=C);
    M9(M9.Z-=Z) = ND4B(M7.Z-=A,M42.Z-=B,M2.Z-=C,M8.Z-=D);
    M31(M31.Z-=Z) = AND2B(M1.Z-=A,M9.Z-=B);
    M1(M1.Z-=Z) = ND4B(M19.Z-=A,M3.Z-=B,M2.Z-=C,M40.Z-=D);
    M26(M26.Z-=Z) = ND3B(STBIT0I-=B,M19.Z-=A,M2.Z-=C);
    M16(M16.Z-=Z) = AND2B(M15.Z-=A,M2.Z-=B);
    M17(M17.Z-=Z) = ND3B(M16.Z-=B,M14.Z-=A,M8.Z-=C);
    M14(M14.Z-=Z) = AND2B(M7.Z-=A,M42.Z-=B);
    M4(M4.Z-=Z) = ND3B(M19.Z-=A,M42.Z-=B,M40.Z-=C);
    M21(M21.Z-=Z) = ND3B(M20.Z-=B,M11.Z-=A,M40.Z-=C);
    M34(M34.Z-=Z) = AND2B(M17.Z-=A,M21.Z-=B);
    M37(STBIT0O-=Z) = ND3B(M36.Z-=C,M35.Z-=B,M34.Z-=A);
    M35(M35.Z-=Z) = AND2B(M24.Z-=A,M25.Z-=B);
```

```
M25(M25.Z-=Z) = ND3B(STBIT0I-=A,M41.Z-=B,M8.Z-=C);
M18(M18.Z-=Z) = ND3B(M7.Z-=A,M42.Z-=B,M8.Z-=C);
M30(STBIT2O-=Z) = ND4B(M10.Z-=B,M4.Z-=A,M22.Z-=D,M18.Z-=C);
M22(M22.Z-=Z) = ND3B(M19.Z-=A,M3.Z-=B,M8.Z-=C);
M3(M3.Z-=Z) = N1C(CD-=A);


/* extractors ******************************/


/* type converters *********************/

ANNOTATIONS
{
 BUS BUS_TYPE = "DOT";
}

END MODULE;


/* * * * * * * Contents of NET file YAUCNTV4FN.NET * * * * * * */

/*******************************************************/
/* Netlist copyright (C) 1989 LSI Logic Corporation */
/*******************************************************/


MODULE YAUCNTV4FN;

INPUTS      CLRYAU,CP,ENYAU,FR,LIM,LR,LR_1,LS_1,RESET_,SR,YINCEN,
            YINT,YINT_1;
OUTPUTS     CE,CLD,CLRCNT_,DCR_,EOR,HLD,INCY,RLD,RST_,YINTSND;

LEVEL FUNCTION;
DEFINE
 /* implicit connectors *******************/

   YINCEN- = (YINCEN);
   SR- = (SR);
   LS_1- = (LS_1);
   LR_1- = (LR_1);
   YINT- = (YINT);
   YINT_1- = (YINT_1);
   LR- = (LR);
   LIM- = (LIM);
   ENYAU- = (ENYAU);
   CLRYAU- = (CLRYAU);
   HLD- = (HLD);
   CP- = (CP);
   RESET_- = (RESET_);
   RESET_- = (RESET_);
   YINTSND- = (YINTSND);
   EOR- = (EOR);
   INCY- = (INCY);
   CLD- = (CLD);
   RLD- = (RLD);
   CE- = (CE);
   CLRCNT_- = (CLRCNT_);
   RST_- = (RST_);
   DCR_- = (DCR_);
   CP- = (CP);
   CP- = (CP);
   FR- = (FR);


 /* part instances **************************/

  U1(HLD-=Q) = FD4A(RESET_-=SD,U5.HLD-=D,CP-=CP);
  U7.8(U7.Q-.8=Q,U7.QN-.8=QN) = FD2A(U7.D-.8=D,RESET_-=CD,CP-=CP);
  U7.7(U7.Q-.7=Q,U7.QN-.7=QN) = FD2A(U7.D-.7=D,RESET_-=CD,CP-=CP);
  U7.6(U7.Q-.6=Q,U7.QN-.6=QN) = FD2A(U7.D-.6=D,RESET_-=CD,CP-=CP);
  U7.5(U7.Q-.5=Q,U7.QN-.5=QN) = FD2A(U7.D-.5=D,RESET_-=CD,CP-=CP);
```

```
    U7.4(U7.Q-.4=Q,U7.QN-.4=QN) = FD2A(U7.D-.4=D,RESET_-=CD,CP-=CP);
    U7.3(U7.Q-.3=Q,U7.QN-.3=QN) = FD2A(U7.D-.3=D,RESET_-=CD,CP-=CP);
    U7.2(U7.Q-.2=Q,U7.QN-.2=QN) = FD2A(U7.D-.2=D,RESET_-=CD,CP-=CP);
    U7.1(U7.Q-.1=Q,U7.QN-.1=QN) = FD2A(U7.D-.1=D,RESET_-=CD,CP-=CP);
    U7.0(U7.Q-.0=Q,U7.QN-.0=QN) = FD2A(U7.D-.0=D,RESET_-=CD,CP-=CP);
    U0.2(U0.Q-.2=Q) = FD2A(RESET_-=CD,CP-=CP,U0.D-.2=D);
    U0.1(U0.Q-.1=Q) = FD2A(RESET_-=CD,CP-=CP,U0.D-.1=D);
    U0.0(U0.Q-.0=Q) = FD2A(RESET_-=CD,CP-=CP,U0.D-.0=D);
    U5(U5.EOR-=EOR,U5.DCR-=DCR,U5.CLRCNT-=CLRCNT,U5.CLD-=CLD,
            U5.CE-=CE,U5.INCY-=INCY,U5.RLD-=RLD,U5.RST-=RST,
            U5.HLD-=HLD,U5.YINTSND-=YINTSND,U5.STBIT0O-=STBIT0O,
            U5.STBIT1O-=STBIT1O,U5.STBIT2O-=STBIT2O) = YAUCNTV4CR(
            YINCEN-=YINCEN,U5.STBIT2I-=STBIT2I,U5.STBIT1I-=STBIT1I,
            U5.STBIT0I-=STBIT0I,SR-=SR,LS_1-=LS_1,LR_1-=LR_1,
            YINT-=YINT,YINT_1-=YINT_1,LR-=LR,LIM-=LIM,FR-=FR,
            ENYAU-=ENYAU,CLRYAU-=CLRYAU);

  /* extractors ******************************/

    U7.D-.5 = (U5.INCY-);
    U7.D-.6 = (U5.RLD-);
    U7.D-.4 = (U5.EOR-);
    U7.D-.1 = (U5.CLD-);
    U7.D-.8 = (U5.YINTSND-);
    U7.D-.3 = (U5.DCR-);
    U7.D-.0 = (U5.CE-);
    U7.D-.2 = (U5.CLRCNT-);
    U7.D-.7 = (U5.RST-);
    U7.Q-.8 = (YINTSND-);
    U7.Q-.4 = (EOR-);
    U7.Q-.5 = (INCY-);
    U7.Q-.1 = (CLD-);
    U7.Q-.6 = (RLD-);
    U7.Q-.0 = (CE-);
    U7.QN-.2 = (CLRCNT_-);
    U7.QN-.7 = (RST_-);
    U7.QN-.3 = (DCR_-);
    U0.Q-.2 = (U5.STBIT2I-);
    U0.Q-.1 = (U5.STBIT1I-);
    U0.Q-.0 = (U5.STBIT0I-);
    U0.D-.0 = (U5.STBIT0O-);
    U0.D-.1 = (U5.STBIT1O-);
    U0.D-.2 = (U5.STBIT2O-);

  /* type converters *********************/

ANNOTATIONS
{
  BUS BUS_TYPE = "DOT";
}

END MODULE;


/* * * * * * *  Contents of NET file CNT3UDFN.NET  * * * * * * */

/*******************************************************/
/*  Netlist copyright (C) 1989 LSI Logic Corporation  */
/*******************************************************/


MODULE CNT3UDFN;

INPUTS      CD,CP,CU,DI.2,DI.1,DI.0,LD_,RESET_;
OUTPUTS     BR,CO,Q.2,Q.1,Q.0;

LEVEL FUNCTION;
DEFINE


/* implicit connectors *******************/
```

```
    CU- = (CU);
    CO- = (CO);
    BR- = (BR);
    RESET_- = (RESET_);
    Q-.2 = (Q.2);
    Q-.1 = (Q.1);
    Q-.0 = (Q.0);
    LD_- = (LD_);
    CP- = (CP);
    DI-.2 = (DI.2);
    DI-.1 = (DI.1);
    DI-.0 = (DI.0);
    CD- = (CD);


  /* part instances ***************************/

    U0.2(U0.Q-.2=Q) = FD2SA(U0.TI-.2=TI,RESET_-=CD,LD_-=TE,CP-=CP,
            U0.D-.2=D);
    U0.1(U0.Q-.1=Q) = FD2SA(U0.TI-.1=TI,RESET_-=CD,LD_-=TE,CP-=CP,
            U0.D-.1=D);
    U0.0(U0.Q-.0=Q) = FD2SA(U0.TI-.0=TI,RESET_-=CD,LD_-=TE,CP-=CP,
            U0.D-.0=D);
    U3(CO-=CO,BR-=BR,U3.STBIT2O-=STBIT2O,U3.STBIT1O-=STBIT1O,
            U3.STBIT0O-=STBIT0O) = CNT3UDCR(CD-=CD,CU-=CU,
            U3.STBIT0I-=STBIT0I,U3.STBIT1I-=STBIT1I,U3.STBIT2I-=STBIT2I);


  /* extractors *******************************/

    U0.TI-.2 = (U3.STBIT2O-);
    U0.TI-.1 = (U3.STBIT1O-);
    U0.Q-.0 = (U3.STBIT0I-);
    U0.Q-.0 = (Q-.2);
    U0.Q-.1 = (Q-.1);
    U0.Q-.2 = (Q-.0);
    U0.Q-.1 = (U3.STBIT1I-);
    U0.Q-.2 = (U3.STBIT2I-);
    U0.D-.0 = (DI-.2);
    U0.D-.1 = (DI-.1);
    U0.D-.2 = (DI-.0);
    U0.TI-.0 = (U3.STBIT0O-);


  /* type converters *********************/

ANNOTATIONS
{
  BUS BUS_TYPE = "DOT";
}

END MODULE;



/* * * * * * *  Contents of NET file RWORDCR.NET  * * * * * * */

/******************************************************/
/*  Netlist copyright (C) 1989 LSI Logic Corporation  */
/******************************************************/

MODULE RWORDCR;

INPUTS      CD,CU,STBIT0I,STBIT1I,STBIT2I;
OUTPUTS     CO,STBIT0O,STBIT1O,STBIT2O;

LEVEL FUNCTION;
DEFINE
  /* implicit connectors *******************/

    STBIT2I- = (STBIT2I);
    CU- = (CU);
    STBIT1I- = (STBIT1I);
    STBIT0I- = (STBIT0I);
```

```
    CO- = (CO);
    STBIT0O- = (STBIT0O);
    STBIT1O- = (STBIT1O);
    STBIT2O- = (STBIT2O);
    CD- = (CD);

  /* part instances ***************************/

    M14(M14.Z-=Z) = N1C(CU-=A);
    M36(M36.Z-=Z) = ND4B(M4.Z-=C,CU-=A,STBIT1I-=D,CD-=B);
    M37(M37.Z-=Z) = ND4B(M4.Z-=B,M14.Z-=A,STBIT1I-=C,STBIT2I-=D);
    M15(M15.Z-=Z) = AND2B(M14.Z-=A,CD-=B);
    M7(M7.Z-=Z) = N1B(STBIT1I-=A);
    M4(M4.Z-=Z) = N1C(STBIT0I-=A);
    M11(M11.Z-=Z) = AND2C(M7.Z-=B,STBIT0I-=A);
    M34(M34.Z-=Z) = ND4B(M2.Z-=B,M12.Z-=D,M4.Z-=C,CU-=A);
    M45(CO-=Z) = N1B(M24.Z-=A);
    M24(M24.Z-=Z) = ND3B(M12.Z-=C,M1.Z-=A,M11.Z-=B);
    M12(M12.Z-=Z) = N1C(STBIT2I-=A);
    M10(M10.Z-=Z) = AND2B(CU-=A,CD-=B);
    M13(M13.Z-=Z) = ND3B(M12.Z-=C,M10.Z-=A,M11.Z-=B);
    M44(STBIT0O-=Z) = ND4B(M13.Z-=A,M27.Z-=B,M30.Z-=C,M33.Z-=D);
    M33(M33.Z-=Z) = ND3B(M12.Z-=C,M31.Z-=A,M11.Z-=B);
    M17(M17.Z-=Z) = ND3B(M12.Z-=C,M15.Z-=A,M11.Z-=B);
    M27(M27.Z-=Z) = ND3B(M12.Z-=C,M8.Z-=B,M15.Z-=A);
    M8(M8.Z-=Z) = AND2B(M7.Z-=B,M4.Z-=A);
    M19(M19.Z-=Z) = AND2B(M4.Z-=A,STBIT1I-=B);
    M35(M35.Z-=Z) = ND4B(M2.Z-=A,M12.Z-=D,M4.Z-=B,STBIT1I-=C);
    M42(M42.Z-=Z) = AND2B(M36.Z-=B,M35.Z-=A);
    M43(STBIT1O-=Z) = ND3B(M37.Z-=C,M41.Z-=A,M42.Z-=B);
    M41(M41.Z-=Z) = AND2B(M17.Z-=B,M9.Z-=A);
    M9(M9.Z-=Z) = ND3B(M1.Z-=A,M8.Z-=B,STBIT2I-=C);
    M1(M1.Z-=Z) = AND2B(M2.Z-=B,CU-=A);
    M3(M3.Z-=Z) = ND4B(M4.Z-=C,CU-=A,STBIT2I-=D,CD-=B);
    M38(M38.Z-=Z) = AND2B(M17.Z-=B,M3.Z-=A);
    M40(STBIT2O-=Z) = ND3B(M34.Z-=C,M38.Z-=A,M39.Z-=B);
    M39(M39.Z-=Z) = AND2B(M21.Z-=B,M20.Z-=A);
    M20(M20.Z-=Z) = ND3B(M12.Z-=C,M15.Z-=A,M19.Z-=B);
    M30(M30.Z-=Z) = ND3B(M1.Z-=A,M19.Z-=B,STBIT2I-=C);
    M21(M21.Z-=Z) = ND4B(M2.Z-=B,M4.Z-=C,M14.Z-=A,STBIT2I-=D);
    M31(M31.Z-=Z) = AND2B(M2.Z-=B,M14.Z-=A);
    M2(M2.Z-=Z) = N1C(CD-=A);

  /* extractors ******************************/


  /* type converters *********************/

ANNOTATIONS
{
  BUS BUS_TYPE = "DOT";
}

END MODULE;


/* * * * * * *  Contents of NET file MLCV1CR.NET  * * * * * * */

/*******************************************************/
/*  Netlist copyright (C) 1989 LSI Logic Corporation   */
/*******************************************************/


MODULE MLCV1CR;

INPUTS       CD,CU,NOL0,NOL1,NOL2,STBIT0I,STBIT1I,STBIT2I,STBIT3I,
             STBIT4I;
OUTPUTS      BR,CO,STBIT0O,STBIT1O,STBIT2O,STBIT3O,STBIT4O;

LEVEL FUNCTION;
```

```
DEFINE
  /* implicit connectors ******************/

    STBIT0O- = (STBIT0O);
    STBIT3I- = (STBIT3I);
    STBIT0I- = (STBIT0I);
    STBIT1I- = (STBIT1I);
    CD- = (CD);
    STBIT4I- = (STBIT4I);
    STBIT4O- = (STBIT4O);
    BR- = (BR);
    STBIT3O- = (STBIT3O);
    STBIT1O- = (STBIT1O);
    CO- = (CO);
    NOL2- = (NOL2);
    NOL0- = (NOL0);
    CU- = (CU);
    STBIT2I- = (STBIT2I);
    NOL1- = (NOL1);
    STBIT2O- = (STBIT2O);


  /* part instances *************************/

    M2(M2.Z-=Z) = N1D(STBIT3I-=A);
    M13(M13.Z-=Z) = N1D(STBIT0I-=A);
    M14(M14.Z-=Z) = N1D(STBIT1I-=A);
    M11(M11.Z-=Z) = N1D(CD-=A);
    M311(M311.Z-=Z) = N1D(M1.Z-=A);
    M1(M1.Z-=Z) = N1D(STBIT4I-=A);
    M320(M320.Z-=Z) = ND3B(M304.Z-=A,M305.Z-=B,M2.Z-=C);
    M70(M70.Z-=Z) = AND2B(M302.Z-=A,M14.Z-=B);
    M134(M134.Z-=Z) = AND2B(M14.Z-=A,M4.Z-=B);
    M162(M162.Z-=Z) = AND3B(M13.Z-=A,M14.Z-=B,M4.Z-=C);
    M223(M223.Z-=Z) = AND3B(M308.Z-=B,M307.Z-=A,M1.Z-=C);
    M322(M322.Z-=Z) = ND3B(M6.Z-=A,M305.Z-=B,M14.Z-=C);
    M315(M315.Z-=Z) = ND4B(M6.Z-=A,M11.Z-=B,M4.Z-=C,M311.Z-=D);
    M346(M346.Z-=Z) = AND2B(M132.Z-=B,M104.Z-=A);
    M73(M73.Z-=Z) = AND3B(M301.Z-=C,M18.Z-=A,M19.Z-=B);
    M161(M161.Z-=Z) = AND3B(M6.Z-=B,M304.Z-=C,M297.Z-=A);
    M189(M189.Z-=Z) = ND4B(M297.Z-=A,M305.Z-=B,M2.Z-=C,M1.Z-=D);
    M257(M257.Z-=Z) = AND2B(M14.Z-=A,M1.Z-=B);
    M151(M151.Z-=Z) = AND3B(M14.Z-=A,M4.Z-=B,M1.Z-=C);
    M152(M152.Z-=Z) = ND3B(M151.Z-=C,M133.Z-=A,M46.Z-=B);
    M51(M51.Z-=Z) = AND2B(M2.Z-=B,M307.Z-=A);
    M45(M45.Z-=Z) = AND2B(M302.Z-=B,M18.Z-=A);
    M3(M3.Z-=Z) = AND2B(M307.Z-=A,M4.Z-=B);
    M183(M183.Z-=Z) = AND2B(M11.Z-=A,M4.Z-=B);
    M226(M226.Z-=Z) = AND2B(M11.Z-=A,M14.Z-=B);
    M228(M228.Z-=Z) = ND3B(M226.Z-=B,M182.Z-=A,M34.Z-=C);
    M239(M239.Z-=Z) = AND2B(M6.Z-=A,M13.Z-=B);
    M22(M22.Z-=Z) = AND2B(M308.Z-=A,M310.Z-=B);
    M95(M95.Z-=Z) = AND3B(M2.Z-=B,M4.Z-=A,M1.Z-=C);
    M398(M398.Z-=Z) = AND2B(M164.Z-=A,M169.Z-=B);
    M27(M27.Z-=Z) = ND3B(M25.Z-=B,M24.Z-=A,M26.Z-=C);
    M169(M169.Z-=Z) = ND3B(M25.Z-=B,M24.Z-=A,M34.Z-=C);
    M378(M378.Z-=Z) = AND2B(M224.Z-=B,M216.Z-=A);
    M208(M208.Z-=Z) = ND3B(M310.Z-=C,M187.Z-=B,M53.Z-=A);
    M353(M353.Z-=Z) = AND2B(M220.Z-=B,M208.Z-=A);
    M377(M377.Z-=Z) = AND2B(M212.Z-=B,M208.Z-=A);
    M402(M402.Z-=Z) = AND2B(M212.Z-=A,M216.Z-=B);
    M210(M210.Z-=Z) = AND2B(M11.Z-=A,M307.Z-=B);
    M212(M212.Z-=Z) = ND3B(M196.Z-=C,M210.Z-=B,M182.Z-=A);
    M196(M196.Z-=Z) = AND3B(M2.Z-=B,M308.Z-=A,M1.Z-=C);
    M342(M342.Z-=Z) = AND2B(M56.Z-=A,M68.Z-=B);
    M68(M68.Z-=Z) = ND3B(M55.Z-=C,M65.Z-=A,M54.Z-=B);
    M314(M314.Z-=Z) = ND4B(M6.Z-=A,M11.Z-=B,M310.Z-=D,M4.Z-=C);
    M361(M361.Z-=Z) = AND2B(M296.Z-=A,M314.Z-=B);
    M290(M290.Z-=Z) = AND2B(M6.Z-=A,M305.Z-=B);
    M292(M292.Z-=Z) = ND3B(M310.Z-=C,M290.Z-=A,M3.Z-=B);
    M319(M319.Z-=Z) = ND4B(M6.Z-=A,M11.Z-=B,M2.Z-=D,M307.Z-=C);
    M369(M369.Z-=Z) = AND2B(M132.Z-=B,M120.Z-=A);
    M345(M345.Z-=Z) = AND2B(M84.Z-=A,M100.Z-=B);
    M366(M366.Z-=Z) = AND2B(M78.Z-=A,M92.Z-=B);
```

```
M125(M125.Z--Z) = AND3B(M302.Z--C,M40.Z--B,M18.Z--A);
M38(M38.Z--Z) = AND2B(M305.Z--A,M14.Z--B);
M303(M303.Z--Z) = ND3B(M192.Z--B,M65.Z--A,M1.Z--C);
M387(M387.Z--Z) = AND2B(M303.Z--A,M306.Z--B);
M306(M306.Z--Z) = ND3B(M192.Z--B,M53.Z--A,M1.Z--C);
M190(M190.Z--Z) = AND2B(M11.Z--B,M301.Z--A);
M193(M193.Z--Z) = ND3B(M190.Z--A,M192.Z--C,M175.Z--B);
M192(M192.Z--Z) = AND2C(M2.Z--B,M308.Z--A);
M237(M237.Z--Z) = ND3B(M38.Z--B,M192.Z--C,M182.Z--A);
M36(M36.Z--Z) = AND2B(M18.Z--A,M19.Z--B);
M39(M39.Z--Z) = ND3B(M38.Z--C,M36.Z--A,M12.Z--B);
M273(M273.Z--Z) = ND3B(M310.Z--C,M38.Z--B,M65.Z--A);
M244(M244.Z--Z) = AND2B(M310.Z--B,M4.Z--A);
M300(M300.Z--Z) = ND4B(M302.Z--A,M304.Z--B,M13.Z--C,M311.Z--D);
M336(M336.Z--Z) = AND2B(M300.Z--A,M309.Z--B);
M309(M309.Z--Z) = ND3B(M244.Z--B,M5.Z--A,M1.Z--C);
M277(M277.Z--Z) = ND3B(M244.Z--B,M182.Z--A,M1.Z--C);
M358(M358.Z--Z) = AND2B(M273.Z--A,M277.Z--B);
M284(M284.Z--Z) = AND2B(M310.Z--B,M14.Z--A);
M246(M246.Z--Z) = AND2B(M302.Z--A,M13.Z--B);
M281(M281.Z--Z) = ND3B(M2.Z--C,M246.Z--A,M199.Z--B);
M285(M285.Z--Z) = ND3B(M284.Z--B,M246.Z--A,M1.Z--C);
M359(M359.Z--Z) = ND3B(M358.Z--B,M357.Z--A,M285.Z--C);
M262(M262.Z--Z) = ND3B(M199.Z--B,M71.Z--C,M5.Z--A);
M251(M251.Z--Z) = ND3B(M199.Z--B,M53.Z--A,M311.Z--C);
M382(M382.Z--Z) = AND2B(M251.Z--A,M262.Z--B);
M333(M333.Z--Z) = AND2B(M254.Z--A,M258.Z--B);
M386(M386.Z--Z) = AND2B(M289.Z--A,M299.Z--B);
M299(M299.Z--Z) = ND3B(M187.Z--B,M53.Z--A,M311.Z--C);
M335(M335.Z--Z) = ND3B(M334.Z--B,M333.Z--A,M299.Z--C);
M334(M334.Z--Z) = AND2B(M262.Z--A,M270.Z--B);
M270(M270.Z--Z) = ND3B(M199.Z--B,M9.Z--C,M5.Z--A);
M357(M357.Z--Z) = AND2B(M245.Z--A,M270.Z--B);
M278(M278.Z--Z) = ND4B(M6.Z--A,M307.Z--C,M13.Z--B,M310.Z--D);
M407(M407.Z--Z) = ND3B(M406.Z--B,M405.Z--A,M278.Z--C);
M406(M406.Z--Z) = AND2B(M245.Z--A,M266.Z--B);
M266(M266.Z--Z) = ND3B(M159.Z--B,M34.Z--C,M5.Z--A);
M159(M159.Z--Z) = AND2B(M308.Z--B,M307.Z--A);
M122(M122.Z--Z) = AND3B(M302.Z--A,M11.Z--B,M13.Z--C);
M155(M155.Z--Z) = AND2B(M307.Z--A,M311.Z--B);
M156(M156.Z--Z) = ND3B(M122.Z--B,M121.Z--A,M155.Z--C);
M60(M60.Z--Z) = ND3B(M55.Z--C,M54.Z--B,M12.Z--A);
M424(M424.Z--Z) = AND3B(M52.Z--B,M48.Z--A,M60.Z--C);
M428(CO--Z) = ND3B(M424.Z--B,M423.Z--A,M427.Z--C);
M427(M427.Z--Z) = NR2B(M425.Z--A,M426.Z--B);
M426(M426.Z--Z) = ND2B(M156.Z--A,M160.Z--B);
M160(M160.Z--Z) = ND3B(M122.Z--B,M121.Z--A,M159.Z--C);
M121(M121.Z--Z) = AND3B(M40.Z--C,M18.Z--A,M19.Z--B);
M123(M123.Z--Z) = AND2B(M307.Z--A,M310.Z--B);
M124(M124.Z--Z) = ND3B(M122.Z--B,M121.Z--A,M123.Z--C);
M425(M425.Z--Z) = ND2B(M124.Z--A,M128.Z--B);
M128(M128.Z--Z) = ND3B(M90.Z--B,M125.Z--A,M26.Z--C);
M430(M430.Z--Z) = AND2B(M108.Z--B,M96.Z--A);
M392(M392.Z--Z) = AND2B(M96.Z--A,M100.Z--B);
M393(M393.Z--Z) = ND3B(M108.Z--C,M392.Z--B,M391.Z--A);
M391(M391.Z--Z) = AND2B(M78.Z--B,M17.Z--A);
M312(M312.Z--Z) = ND3B(M15.Z--B,M12.Z--A,M1.Z--C);
M15(M15.Z--Z) = AND2C(M13.Z--A,M14.Z--B);
M17(M17.Z--Z) = ND3B(M16.Z--C,M15.Z--B,M12.Z--A);
M16(M16.Z--Z) = AND3B(M308.Z--A,M310.Z--B,M311.Z--C);
M112(M112.Z--Z) = ND3B(M90.Z--B,M89.Z--A,M16.Z--C);
M367(M367.Z--Z) = AND2B(M116.Z--B,M104.Z--A);
M63(M63.Z--Z) = AND3B(M310.Z--B,M4.Z--A,M311.Z--C);
M116(M116.Z--Z) = ND3B(M90.Z--B,M89.Z--A,M63.Z--C);
M91(M91.Z--Z) = AND2B(M308.Z--A,M1.Z--B);
M92(M92.Z--Z) = ND3B(M90.Z--B,M89.Z--A,M91.Z--C);
M324(M324.Z--Z) = AND2B(M88.Z--A,M92.Z--B);
M323(M323.Z--Z) = AND2B(M10.Z--A,M84.Z--B);
M327(M327.Z--Z) = NR2B(M325.Z--A,M326.Z--B);
M325(M325.Z--Z) = ND3B(M324.Z--B,M323.Z--A,M100.Z--C);
M100(M100.Z--Z) = ND3B(M98.Z--B,M97.Z--A,M71.Z--C);
M97(M97.Z--Z) = AND3B(M302.Z--B,M11.Z--C,M301.Z--A);
M370(M370.Z--Z) = AND2B(M164.Z--B,M140.Z--A);
M395(M395.Z--Z) = AND2B(M132.Z--A,M140.Z--B);
```

```
M140(M140.Z--Z) = ND3B(M98.Z--B,M97.Z--A,M26.Z--C);
M98(M98.Z--Z) = AND3B(M307.Z--B,M13.Z--A,M4.Z--C);
M28(M28.Z--Z) = AND3B(M302.Z--B,M11.Z--C,M298.Z--A);
M120(M120.Z--Z) = ND3B(M98.Z--B,M28.Z--A,M26.Z--C);
M394(M394.Z--Z) = AND2B(M112.Z--A,M120.Z--B);
M396(M396.Z--Z) = ND3B(M395.Z--B,M394.Z--A,M148.Z--C);
M397(M397.Z--Z) = NR2B(M393.Z--A,M396.Z--B);
M412(STBIT1O--Z) = ND3B(M397.Z--A,M411.Z--C,M404.Z--B);
M411(M411.Z--Z) = NR2B(M407.Z--A,M410.Z--B);
M410(M410.Z--Z) = ND3B(M409.Z--B,M408.Z--A,M319.Z--C);
M408(M408.Z--Z) = AND2B(M292.Z--A,M296.Z--B);
M296(M296.Z--Z) = ND3B(M310.Z--C,M175.Z--B,M65.Z--A);
M65(M65.Z--Z) = AND2C(M302.Z--A,M304.Z--B);
M245(M245.Z--Z) = ND3B(M244.Z--C,M65.Z--A,M54.Z--B);
M54(M54.Z--Z) = AND2C(M305.Z--A,M307.Z--B);
M216(M216.Z--Z) = ND3B(M196.Z--C,M54.Z--B,M5.Z--A);
M328(M328.Z--Z) = AND2B(M197.Z--B,M177.Z--A);
M330(M330.Z--Z) = ND3B(M216.Z--C,M329.Z--B,M328.Z--A);
M329(M329.Z--Z) = AND2B(M212.Z--B,M205.Z--A);
M375(M375.Z--Z) = AND2B(M201.Z--A,M205.Z--B);
M201(M201.Z--Z) = ND3B(M199.Z--B,M182.Z--A,M71.Z--C);
M351(M351.Z--Z) = AND2B(M201.Z--B,M197.Z--A);
M352(M352.Z--Z) = ND3B(M351.Z--C,M350.Z--B,M349.Z--A);
M350(M350.Z--Z) = AND2B(M173.Z--B,M169.Z--A);
M147(M147.Z--Z) = AND3B(M2.Z--B,M307.Z--A,M311.Z--C);
M85(M85.Z--Z) = AND2B(M302.Z--B,M301.Z--A);
M173(M173.Z--Z) = ND3B(M147.Z--C,M85.Z--A,M86.Z--B);
M399(M399.Z--Z) = AND2B(M173.Z--A,M177.Z--B);
M177(M177.Z--Z) = ND3B(M95.Z--C,M175.Z--B,M12.Z--A);
M175(M175.Z--Z) = AND2C(M307.Z--B,M13.Z--A);
M197(M197.Z--Z) = ND3B(M196.Z--C,M175.Z--B,M5.Z--A);
M401(M401.Z--Z) = AND2B(M193.Z--A,M197.Z--B);
M403(M403.Z--Z) = ND3B(M220.Z--C,M402.Z--B,M401.Z--A);
M404(M404.Z--Z) = NR2B(M400.Z--A,M403.Z--B);
M400(M400.Z--Z) = ND3B(M399.Z--B,M398.Z--A,M181.Z--C);
M181(M181.Z--Z) = ND3B(M24.Z--A,M43.Z--B,M26.Z--C);
M43(M43.Z--Z) = AND3B(M305.Z--A,M308.Z--C,M14.Z--B);
M41(M41.Z--Z) = AND2B(M40.Z--B,M18.Z--A);
M44(M44.Z--Z) = ND3B(M43.Z--C,M41.Z--A,M12.Z--B);
M423(M423.Z--Z) = AND3B(M39.Z--B,M23.Z--A,M44.Z--C);
M21(M21.Z--Z) = AND3B(M11.Z--A,M307.Z--C,M13.Z--B);
M20(M20.Z--Z) = AND3B(M302.Z--C,M18.Z--A,M19.Z--B);
M23(M23.Z--Z) = ND3B(M21.Z--B,M20.Z--A,M22.Z--C);
M241(M241.Z--Z) = ND3B(M239.Z--A,M22.Z--B,M311.Z--C);
M381(M381.Z--Z) = AND2B(M241.Z--A,M248.Z--B);
M248(M248.Z--Z) = ND3B(M246.Z--A,M199.Z--B,M1.Z--C);
M199(M199.Z--Z) = AND2C(M308.Z--B,M14.Z--A);
M289(M289.Z--Z) = ND3B(M310.Z--C,M199.Z--B,M53.Z--A);
M293(M293.Z--Z) = ND4B(M304.Z--A,M310.Z--C,M14.Z--B,M311.Z--D);
M360(M360.Z--Z) = AND2B(M289.Z--A,M293.Z--B);
M316(M316.Z--Z) = ND4B(M304.Z--A,M310.Z--C,M4.Z--B,M311.Z--D);
M362(M362.Z--Z) = ND3B(M361.Z--B,M360.Z--A,M316.Z--C);
M363(M363.Z--Z) = NR2B(M359.Z--A,M362.Z--B);
M364(STBIT3O--Z) = ND3B(M348.Z--A,M363.Z--C,M356.Z--B);
M356(M356.Z--Z) = NR2B(M352.Z--A,M355.Z--B);
M355(M355.Z--Z) = ND3B(M241.Z--C,M354.Z--B,M353.Z--A);
M354(M354.Z--Z) = AND2B(M228.Z--A,M232.Z--B);
M232(M232.Z--Z) = ND3B(M183.Z--B,M182.Z--A,M34.Z--C);
M254(M254.Z--Z) = ND3B(M183.Z--B,M182.Z--A,M1.Z--C);
M182(M182.Z--Z) = AND2C(M302.Z--B,M297.Z--A);
M185(M185.Z--Z) = ND3B(M183.Z--B,M182.Z--A,M26.Z--C);
M373(M373.Z--Z) = AND2B(M169.Z--A,M185.Z--B);
M376(M376.Z--Z) = ND3B(M375.Z--C,M374.Z--B,M373.Z--A);
M374(M374.Z--Z) = AND2B(M193.Z--B,M188.Z--A);
M186(M186.Z--Z) = AND2B(M11.Z--B,M298.Z--A);
M188(M188.Z--Z) = ND3B(M2.Z--C,M186.Z--A,M187.Z--B);
M187(M187.Z--Z) = AND2C(M308.Z--B,M13.Z--A);
M205(M205.Z--Z) = ND3B(M187.Z--B,M71.Z--C,M5.Z--A);
M5(M5.Z--Z) = AND2C(M6.Z--A,M304.Z--B);
M10(M10.Z--Z) = ND3B(M3.Z--B,M9.Z--C,M5.Z--A);
M48(M48.Z--Z) = ND3B(M45.Z--A,M3.Z--C,M46.Z--B);
M52(M52.Z--Z) = ND3B(M51.Z--C,M45.Z--A,M46.Z--B);
M46(M46.Z--Z) = AND2C(M305.Z--B,M11.Z--A);
M258(M258.Z--Z) = ND3B(M257.Z--C,M182.Z--A,M46.Z--B);
```

```
M419(M419.Z-=Z) = ND4B(M245.Z-=A,M273.Z-=C,M258.Z-=B,M286.Z-=D);
M286(M286.Z-=Z) = ND3B(M297.Z-=A,M305.Z-=B,M4.Z-=C);
M297(M297.Z-=Z) = N1C(M18.Z-=A);
M18(M18.Z-=Z) = N1C(NOL2-=A);
M74(M74.Z-=Z) = AND3B(M6.Z-=A,M304.Z-=B,M13.Z-=C);
M84(M84.Z-=Z) = ND3C(M79.Z-=A,M74.Z-=B,M77.Z-=C);
M79(M79.Z-=Z) = AND3B(M298.Z-=B,M40.Z-=C,M18.Z-=A);
M40(M40.Z-=Z) = N1C(NOL0-=A);
M301(M301.Z-=Z) = N1C(M40.Z-=A);
M89(M89.Z-=Z) = AND3C(M302.Z-=C,M301.Z-=B,M298.Z-=A);
M104(M104.Z-=Z) = ND3B(M90.Z-=B,M89.Z-=A,M55.Z-=C);
M415(M415.Z-=Z) = NR2B(M413.Z-=A,M414.Z-=B);
M414(M414.Z-=Z) = ND3B(M96.Z-=A,M112.Z-=C,M104.Z-=B);
M96(M96.Z-=Z) = ND3B(M95.Z-=C,M94.Z-=B,M93.Z-=A);
M93(M93.Z-=Z) = AND3B(M6.Z-=C,M301.Z-=B,M298.Z-=A);
M6(M6.Z-=Z) = N1D(CU-=A);
M302(M302.Z-=Z) = N1D(M6.Z-=A);
M53(M53.Z-=Z) = AND2C(M6.Z-=A,M11.Z-=B);
M56(M56.Z-=Z) = ND3B(M55.Z-=C,M54.Z-=B,M53.Z-=A);
M55(M55.Z-=Z) = AND3C(M2.Z-=B,M308.Z-=A,M311.Z-=C);
M308(M308.Z-=Z) = N1D(M4.Z-=A);
M4(M4.Z-=Z) = N1D(STBIT2I-=A);
M75(M75.Z-=Z) = ND2B(M14.Z-=A,M4.Z-=B);
M233(M233.Z-=Z) = ND4B(M302.Z-=B,M297.Z-=A,M307.Z-=C,M4.Z-=D);
M405(M405.Z-=Z) = AND2B(M224.Z-=A,M233.Z-=B);
M224(M224.Z-=Z) = ND3B(M223.Z-=C,M133.Z-=A,M86.Z-=B);
M133(M133.Z-=Z) = AND2C(M302.Z-=B,M298.Z-=A);
M220(M220.Z-=Z) = ND3B(M219.Z-=C,M133.Z-=A,M86.Z-=B);
M219(M219.Z-=Z) = AND3B(M307.Z-=A,M310.Z-=B,M1.Z-=C);
M310(M310.Z-=Z) = N1D(M2.Z-=A);
M26(M26.Z-=Z) = AND2C(M310.Z-=A,M311.Z-=B);
M31(M31.Z-=Z) = ND3B(M25.Z-=B,M28.Z-=A,M26.Z-=C);
M413(M413.Z-=Z) = ND4B(M27.Z-=A,M84.Z-=C,M92.Z-=D,M31.Z-=B);
M429(M429.Z-=Z) = AND2B(M78.Z-=A,M84.Z-=B);
M431(BR-=Z) = ND3B(M430.Z-=B,M164.Z-=C,M429.Z-=A);
M164(M164.Z-=Z) = ND3C(M162.Z-=B,M161.Z-=A,M9.Z-=C);
M9(M9.Z-=Z) = AND2C(M2.Z-=A,M1.Z-=B);
M88(M88.Z-=Z) = ND3B(M85.Z-=A,M86.Z-=B,M9.Z-=C);
M86(M86.Z-=Z) = AND2C(M11.Z-=A,M13.Z-=B);
M148(M148.Z-=Z) = ND3B(M147.Z-=C,M133.Z-=A,M86.Z-=B);
M349(M349.Z-=Z) = AND2B(M144.Z-=A,M148.Z-=B);
M416(M416.Z-=Z) = ND4B(M116.Z-=A,M164.Z-=D,M144.Z-=B,M152.Z-=C);
M326(M326.Z-=Z) = ND4B(M108.Z-=A,M164.Z-=D,M132.Z-=B,M152.Z-=C);
M132(M132.Z-=Z) = ND3C(M25.Z-=B,M24.Z-=A,M71.Z-=C);
M24(M24.Z-=Z) = AND3C(M302.Z-=B,M297.Z-=A,M11.Z-=C);
M238(M238.Z-=Z) = ND4B(M302.Z-=A,M304.Z-=B,M14.Z-=C,M311.Z-=D);
M331(M331.Z-=Z) = ND4B(M220.Z-=A,M224.Z-=B,M251.Z-=D,M238.Z-=C);
M332(M332.Z-=Z) = NR2B(M330.Z-=A,M331.Z-=B);
M340(STBIT4O-=Z) = ND3B(M327.Z-=A,M339.Z-=C,M332.Z-=B);
M339(M339.Z-=Z) = NR2B(M335.Z-=A,M338.Z-=B);
M338(M338.Z-=Z) = ND3B(M337.Z-=B,M336.Z-=A,M315.Z-=C);
M337(M337.Z-=Z) = AND2B(M312.Z-=A,M313.Z-=B);
M313(M313.Z-=Z) = ND4B(M302.Z-=A,M304.Z-=B,M4.Z-=C,M311.Z-=D);
M304(M304.Z-=Z) = N1D(M11.Z-=A);
M94(M94.Z-=Z) = AND3B(M304.Z-=A,M13.Z-=B,M14.Z-=C);
M108(M108.Z-=Z) = ND3B(M105.Z-=A,M95.Z-=C,M94.Z-=B);
M105(M105.Z-=Z) = AND3B(M6.Z-=C,M40.Z-=B,M19.Z-=A);
M19(M19.Z-=Z) = N1C(NOL1-=A);
M298(M298.Z-=Z) = N1C(M19.Z-=A);
M69(M69.Z-=Z) = AND2B(M301.Z-=B,M298.Z-=A);
M72(M72.Z-=Z) = ND3B(M70.Z-=B,M69.Z-=A,M71.Z-=C);
M343(M343.Z-=Z) = AND2B(M78.Z-=B,M72.Z-=A);
M78(M78.Z-=Z) = ND3C(M74.Z-=B,M73.Z-=A,M77.Z-=C);
M77(M77.Z-=Z) = NR2C(M76.Z-=B,M75.Z-=A);
M76(M76.Z-=Z) = ND2B(M2.Z-=A,M1.Z-=B);
M71(M71.Z-=Z) = AND2C(M310.Z-=A,M1.Z-=B);
M136(M136.Z-=Z) = ND3B(M134.Z-=B,M133.Z-=A,M71.Z-=C);
M347(M347.Z-=Z) = ND3B(M346.Z-=B,M345.Z-=A,M136.Z-=C);
M348(M348.Z-=Z) = NR2B(M344.Z-=A,M347.Z-=B);
M344(M344.Z-=Z) = ND3B(M343.Z-=C,M342.Z-=B,M341.Z-=A);
M341(M341.Z-=Z) = AND2B(M10.Z-=A,M35.Z-=B);
M35(M35.Z-=Z) = ND3B(M34.Z-=C,M15.Z-=B,M12.Z-=A);
M34(M34.Z-=Z) = AND2C(M2.Z-=A,M311.Z-=B);
M144(M144.Z-=Z) = ND3B(M142.Z-=B,M28.Z-=A,M34.Z-=C);
M142(M142.Z-=Z) = AND3B(M305.Z-=A,M14.Z-=B,M4.Z-=C);
```

```
    M305(M305.Z--Z) = N1D(M13.Z--A);
    M90(M90.Z--Z) = AND3C(M305.Z--B,M11.Z--A,M14.Z--C);
    M12(M12.Z--Z) = AND2C(M302.Z--A,M11.Z--B);
    M64(M64.Z--Z) = ND3B(M63.Z--C,M15.Z--B,M12.Z--A);
    M365(M365.Z--Z) = AND2B(M10.Z--A,M64.Z--B);
    M368(M368.Z--Z) = ND3B(M367.Z--C,M366.Z--B,M365.Z--A);
    M372(M372.Z--Z) = NR2B(M368.Z--A,M371.Z--B);
    M371(M371.Z--Z) = ND3B(M370.Z--B,M369.Z--A,M165.Z--C);
    M165(M165.Z--Z) = ND4B(M302.Z--A,M304.Z--B,M308.Z--D,M14.Z--C);
    M307(M307.Z--Z) = N1D(M14.Z--A);
    M25(M25.Z--Z) = AND3C(M308.Z--C,M307.Z--B,M13.Z--A);
    M282(M282.Z--Z) = ND4B(M302.Z--A,M304.Z--B,M308.Z--D,M13.Z--C);
    M385(M385.Z--Z) = AND2B(M281.Z--A,M282.Z--B);
    M388(M388.Z--Z) = ND3B(M387.Z--C,M386.Z--B,M385.Z--A);
    M389(M389.Z--Z) = NR2B(M384.Z--A,M388.Z--B);
    M384(M384.Z--Z) = ND3B(M383.Z--C,M382.Z--B,M381.Z--A);
    M383(M383.Z--Z) = AND2B(M266.Z--A,M274.Z--B);
    M274(M274.Z--Z) = ND4B(M304.Z--A,M308.Z--C,M14.Z--B,M311.Z--D);
    M318(M318.Z--Z) = ND4B(M6.Z--A,M307.Z--B,M4.Z--C,M311.Z--D);
    M409(M409.Z--Z) = AND2B(M317.Z--A,M318.Z--B);
    M317(M317.Z--Z) = ND4B(M302.Z--A,M304.Z--B,M2.Z--D,M307.Z--C);
    M321(M321.Z--Z) = ND3B(M6.Z--A,M305.Z--B,M2.Z--C);
    M420(M420.Z--Z) = ND4B(M292.Z--A,M320.Z--B,M322.Z--D,M321.Z--C);
    M421(M421.Z--Z) = NR2B(M419.Z--A,M420.Z--B);
    M422(STBIT00--Z) = ND3B(M415.Z--A,M421.Z--C,M418.Z--B);
    M418(M418.Z--Z) = NR2B(M416.Z--A,M417.Z--B);
    M417(M417.Z--Z) = ND3B(M181.Z--A,M189.Z--B,M237.Z--C);
    M379(M379.Z--Z) = ND3B(M378.Z--B,M377.Z--A,M237.Z--C);
    M380(M380.Z--Z) = NR2B(M376.Z--A,M379.Z--B);
    M390(STBIT20--Z) = ND3B(M372.Z--A,M389.Z--C,M380.Z--B);


  /* extractors ******************************/


  /* type converters *********************/

ANNOTATIONS
{
  BUS BUS_TYPE = "DOT";
}

END MODULE;


/* * * * * * *  Contents of NET file RWORDFN.NET  * * * * * * */

/*******************************************************/
/*  Netlist copyright (C) 1989 LSI Logic Corporation  */
/*******************************************************/


MODULE RWORDFN;

INPUTS      CD,CLD,CP,CU,RESET_,RLD,S_MODE,UPDATE;
OUTPUTS     Q.2,Q.1,Q.0;

LEVEL FUNCTION;
DEFINE
  /* implicit connectors *******************/

    RESET_- = (RESET_);
    RESET_- = (RESET_);
    RLD- = (RLD);
    CD- = (CD);
    S_MODE- = (S_MODE);
    UPDATE- = (UPDATE);
    CU- = (CU);
    Q-.2 = (Q.2);
    Q-.1 = (Q.1);
    Q-.0 = (Q.0);
    CP- = (CP);
    CP- = (CP);
    CLD- = (CLD);
```

```
  /* part instances **************************/

    U4(U4.Z-=Z) = AND2A(CD-=A,S_MODE-=B);
    U2(U2.Z-=Z) = OR2B(UPDATE-=A,CU-=B);
    U1(U1.STBIT2O-=STBIT2O,U1.STBIT1O-=STBIT1O,U1.STBIT0O-=STBIT0O)
             = RWORDCR(U4.Z-=CD,U2.Z-=CU,U1.STBIT0I-=STBIT0I,
             U1.STBIT1I-=STBIT1I,U1.STBIT2I-=STBIT2I);
    U5.2(U5.Q-.2=Q) = FD2SA(RESET_-=CD,CP-=CP,RLD-=TE,Q-.2=TI,
             U5.Q-.2=D);
    U5.1(U5.Q-.1=Q) = FD2SA(RESET_-=CD,CP-=CP,RLD-=TE,Q-.1=TI,
             U5.Q-.1=D);
    U5.0(U5.Q-.0=Q) = FD2SA(RESET_-=CD,CP-=CP,RLD-=TE,Q-.0=TI,
             U5.Q-.0=D);
    U0.2(U0.Q-.2=Q) = FD2SA(RESET_-=CD,U5.Q-.2=TI,U0.D-.2=D,CP-=CP,
             CLD-=TE),
    U0.1(U0.Q-.1=Q) = FD2SA(RESET_-=CD,U5.Q-.1=TI,U0.D-.1=D,CP-=CP,
             CLD-=TE);
    U0.0(U0.Q-.0=Q) = FD2SA(RESET_-=CD,U5.Q-.0=TI,U0.D-.0=D,CP-=CP,
             CLD-=TE);


  /* extractors *****************************/

    U0.Q-.0 = (U1.STBIT0I-);
    U0.Q-.1 = (U1.STBIT1I-);
    U0.D-.2 = (U1.STBIT2O-);
    U0.D-.1 = (U1.STBIT1O-);
    U0.D-.0 = (U1.STBIT0O-);
    U0.Q-.2 = (U1.STBIT2I-);
    U0.Q-.0 = (Q-.2);
    U0.Q-.1 = (Q-.1);
    U0.Q-.2 = (Q-.0);


  /* type converters *********************/

ANNOTATIONS
{
  BUS BUS_TYPE = "DOT";
}

END MODULE;


/* * * * * * *  Contents of NET file MLCV1FN.NET  * * * * * * */

/*******************************************************/
/*  Netlist copyright (C) 1989 LSI Logic Corporation   */
/*******************************************************/

MODULE MLCV1FN;

INPUTS      CD,CLD,CP,CU,D.4,D.3,D.2,D.1,D.0,NOL.2,NOL.1,NOL.0,
            RESET_;
OUTPUTS     BR,CO,Q.0,Q.1,Q.2,Q.3,Q.4;

LEVEL FUNCTION;
DEFINE
  /* implicit connectors *******************/

    NOL-.2 = (NOL.2);
    NOL-.1 = (NOL.1);
    NOL-.0 = (NOL.0);
    CD- = (CD);
    CU- = (CU);
    RESET_- = (RESET_);
    CO- = (CO);
    BR- = (BR);
    CP- = (CP);
    CP- = (CP);
    D-.4 = (D.4);
    D-.3 = (D.3);
    D-.2 = (D.2);
```

```
  D-.1 = (D.1);
  D-.0 = (D.0);
  CLD- = (CLD);
  Q-.4 = (Q.0);
  Q-.3 = (Q.1);
  Q-.2 = (Q.2);
  Q-.1 = (Q.3);
  Q-.0 = (Q.4);


 /* part instances *************************/

  U13(U13.Z-=Z) = B3A(RESET_-=A);
  U7(CO-=Q) = FD2A(U6.CO-=D,U13.Z-=CD,CP-=CP);
  U8(BR-=Q) = FD2A(U6.BR-=D,U13.Z-=CD,CP-=CP);
  U1.4(Q-.4=Q) = FD2SA(U13.Z-=CD,CP-=CP,D-.4=TI,CLD-=TE,U1.D-.4=D);
  U1.3(Q-.3=Q) = FD2SA(U13.Z-=CD,CP-=CP,D-.3=TI,CLD-=TE,U1.D-.3=D);
  U1.2(Q-.2=Q) = FD2SA(U13.Z-=CD,CP-=CP,D-.2=TI,CLD-=TE,U1.D-.2=D);
  U1.1(Q-.1=Q) = FD2SA(U13.Z-=CD,CP-=CP,D-.1=TI,CLD-=TE,U1.D-.1=D);
  U1.0(Q-.0=Q) = FD2SA(U13.Z-=CD,CP-=CP,D-.0=TI,CLD-=TE,U1.D-.0=D);
  U6(U6.BR-=BR,U6.CO-=CO,U6.STBIT0O-=STBIT0O,U6.STBIT1O-=STBIT1O,
         U6.STBIT2O-=STBIT2O,U6.STBIT3O-=STBIT3O,U6.STBIT4O-=STBIT4O)
          = MLCV1CR(U6.STBIT0I-=STBIT0I,U6.STBIT1I-=STBIT1I,
         U6.STBIT2I-=STBIT2I,U6.STBIT3I-=STBIT3I,U6.STBIT4I-=STBIT4I,
         U6.NOL1-=NOL1,U6.NOL2-=NOL2,U6.NOL0-=NOL0,CD-=CD,CU-=CU);


 /* extractors ******************************/

  Q-.0 = (U6.STBIT0I-);
  Q-.1 = (U6.STBIT1I-);
  Q-.3 = (U6.STBIT3I-);
  Q-.4 = (U6.STBIT4I-);
  NOL-.2 = (U6.NOL2-);
  NOL-.1 = (U6.NOL1-);
  NOL-.0 = (U6.NOL0-);
  U1.D-.0 = (U6.STBIT0O-);
  U1.D-.2 = (U6.STBIT2O-);
  U1.D-.1 = (U6.STBIT1O-);
  U1.D-.3 = (U6.STBIT3O-);
  U1.D-.4 = (U6.STBIT4O-);
  Q-.2 = (U6.STBIT2I-);


 /* type converters *********************/

ANNOTATIONS
{
  BUS BUS_TYPE = "DOT";
}

END MODULE;



/* * * * * * *  Contents of NET file BMYLCV2.NET  * * * * * * */

/*****************************************************/
/*  Netlist copyright (C) 1989 LSI Logic Corporation  */
/*****************************************************/


MODULE BMYLCV2;

INPUTS      CD,CLD,CP,CU,FD.2,FD.1,FD.0,HLD,NOL.2,NOL.1,NOL.0,
            RESET_,RLD,S_MODE,UPDT;
OUTPUTS     BMYL.4,BMYL.3,BMYL.2,BMYL.1,BMYL.0,COF_ADR.2,
            COF_ADR.1,COF_ADR.0,ROW_ORDER.2,ROW_ORDER.1,
            ROW_ORDER.0;

LEVEL FUNCTION;
DEFINE
  /* implicit connectors *******************/
```

```
NOL-.2 = (NOL.2);
NOL-.1 = (NOL.1);
NOL-.0 = (NOL.0);
CU- = (CU);
CD- = (CD);
CP- = (CP);
CLD- = (CLD);
CLD- = (CLD);
CLD- = (CLD);
S_MODE- = (S_MODE);
UPDT- = (UPDT);
CP- = (CP);
ROW_ORDER-.2 = (ROW_ORDER.2);
ROW_ORDER-.1 = (ROW_ORDER.1);
ROW_ORDER-.0 = (ROW_ORDER.0);
BRESET_- = (BRESET_);
RLD- = (RLD);
CP- = (CP);
BMYL-.0 = (BMYL.4);
BMYL-.1 = (BMYL.3);
BMYL-.2 = (BMYL.2);
BMYL-.3 = (BMYL.1);
BMYL-.4 = (BMYL.0);
BRESET_- = (BRESET_);
RESET_- = (RESET_);
BRESET_- = (BRESET_);
BRESET_- = (BRESET_);
BRESET_- = (BRESET_);
BRESET_- = (BRESET_);
RLD- = (RLD);
RLD- = (RLD);
COF_ADR-.2 = (COF_ADR.2);
COF_ADR-.1 = (COF_ADR.1);
COF_ADR-.0 = (COF_ADR.0);
COF_ADR-.2 = (COF_ADR.2);
COF_ADR-.1 = (COF_ADR.1);
COF_ADR-.0 = (COF_ADR.0);
FD-.2 = (FD.2);
FD-.1 = (FD.1);
FD-.0 = (FD.0);
HLD- = (HLD);
CP- = (CP);
CP- = (CP);
UPDT- = (UPDT);


/* part instances ***************************/

U7(U7.Z-=Z) = N1B(CLD-=A);
U2.4(U2.Q-.4=Q) = FD2SA(BRESET_-=CD,U2.Q-.4=D,RLD-=TE,CP-=CP,
        BMYL-.0=TI);
U2.3(U2.Q-.3=Q) = FD2SA(BRESET_-=CD,U2.Q-.3=D,RLD-=TE,CP-=CP,
        BMYL-.1=TI);
U2.2(U2.Q-.2=Q) = FD2SA(BRESET_-=CD,U2.Q-.2=D,RLD-=TE,CP-=CP,
        BMYL-.2=TI);
U2.1(U2.Q-.1=Q) = FD2SA(BRESET_-=CD,U2.Q-.1=D,RLD-=TE,CP-=CP,
        BMYL-.3=TI);
U2.0(U2.Q-.0=Q) = FD2SA(BRESET_-=CD,U2.Q-.0=D,RLD-=TE,CP-=CP,
        BMYL-.4=TI);
U1(BRESET_-=Z) = B3A(RESET_-=A);
U10(ROW_ORDER-.2=Q.2,ROW_ORDER-.1=Q.1,ROW_ORDER-.0=Q.0) =
        RWORDFN(RLD-=RLD,CLD-=CLD,U5.CO-=CU,U5.BR-=CD,S_MODE-=S_MODE,
        UPDT-=UPDATE,CP-=CP,BRESET_-=RESET_);
U4.2(U4.Q-.2=Q) = FD2SA(BRESET_-=CD,U4.Q-.2=D,CP-=CP,RLD-=TE,
        COF_ADR-.2=TI);
U4.1(U4.Q-.1=Q) = FD2SA(BRESET_-=CD,U4.Q-.1=D,CP-=CP,RLD-=TE,
        COF_ADR-.1=TI);
U4.0(U4.Q-.0=Q) = FD2SA(BRESET_-=CD,U4.Q-.0=D,CP-=CP,RLD-=TE,
        COF_ADR-.0=TI);
U8.2(U8.Z-.2=Z) = N1B(U9.Z-.2=A);
U8.1(U8.Z-.1=Z) = N1B(U9.Z-.1=A);
U8.0(U8.Z-.0=Z) = N1B(U9.Z-.0=A);
U9.2(U9.Z-.2=Z) = MX21LB(U4.Q-.2=B,HLD-=S,FD-.2=A);
U9.1(U9.Z-.1=Z) = MX21LB(U4.Q-.1=B,HLD-=S,FD-.1=A);
```

```
    U9.0(U9.Z-.0=Z) = MX21LB(U4.Q-.0=B,HLD-=S,FD-.0=A);
    U6(U6.Z-=Z) = AND2B(U7.Z-=B,HLD-=A);
    U5(COF_ADR-.2=Q.2,COF_ADR-.1=Q.1,COF_ADR-.0=Q.0,U5.BR-=BR,
            U5.CO-=CO) = CNT3UDFN(BRESET_-=RESET_,CP-=CP,CU-=CU,CD-=CD,
            U8.Z-.2=DI.2,U8.Z-.1=DI.1,U8.Z-.0=DI.0,U6.Z-=LD_);
    U3(BMYL-.0=Q.0,BMYL-.1=Q.1,BMYL-.2=Q.2,BMYL-.3=Q.3,BMYL-.4=Q.4)
              = MLCV1FN(CLD-=CLD,NOL-.2=NOL.2,NOL-.1=NOL.1,NOL-.0=NOL.0,
            U0.Z-=CU,U5.BR-=CL,U2.Q-.4=D.4,U2.Q-.3=D.3,U2.Q-.2=D.2,
            U2.Q-.1=D.1,U2.Q-.0=D.0,BRESET_-=RESET_,CP-=CP);
    U0(U0.Z-=Z) = OR2B(U5.CO-=A,UPDT-=B);

  /* extractors ******************************/


  /* type converters *********************/

ANNOTATIONS

{
  BUS BUS_TYPE = "DOT";
}

END MODULE;


/* * * * * * *  Contents of NET file YAUV2.NET  * * * * * * */

/*******************************************************/
/*  Netlist copyright (C) 1989 LSI Logic Corporation  */
/*******************************************************/


MODULE YAUV2;

INPUTS       CLRYAU,CP,DH_CS_,DL_CS_,ENYAU,FRSTROW,LIM,LSTROW,
             LSTROW_1,LS_1,NOL.2,NOL.1,NOL.0,PDI.15,PDI.14,PDI.13,
             PDI.12,PDI.11,PDI.10,PDI.9,PDI.8,PDI.7,PDI.6,PDI.5,
             PDI.4,PDI.3,PDI.2,PDI.1,PDI.0,RESET_,RND_EN,SCNDROW,
             SCNIN,S_MODE,TEST,WR_,YDWN,YINCEN,YUP;
OUTPUTS      BMYL.4,BMYL.3,BMYL.2,BMYL.1,BMYL.0,COF_ADR.2,
             COF_ADR.1,COF_ADR.0,EOR,INCY,ROW_ORDER.2,ROW_ORDER.1,
             ROW_ORDER.0,YINT,YINTSND;

LEVEL FUNCTION;
DEFINE
  /* implicit connectors ******************/

    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    DH_CS_- = (DH_CS_);
    DL_CS_- = (DL_CS_);
    TEST- = (TEST);
    WR_- = (WR_);
    ROW_ORDER-.2 = (ROW_ORDER.2);
    ROW_ORDER-.1 = (ROW_ORDER.1);
    ROW_ORDER-.0 = (ROW_ORDER.0);
    BMYL-.4 = (BMYL.4);
```

```
BMYL-.3 = (BMYL.3);
BMYL-.2 = (BMYL.2);
BMYL-.1 = (BMYL.1);
BMYL-.0 = (BMYL.0);
NOL-.2 = (NOL.2);
NOL-.1 = (NOL.1);
NOL-.0 = (NOL.0);
YUP- = (YUP);
YDWN- = (YDWN);
RND_EN- = (RND_EN);
LS_1- = (LS_1);
LIM- = (LIM);
BRESET_- = (BRESET_);
EOR- = (EOR);
INCY- = (INCY);
YINTSND- = (YINTSND);
YINCEN- = (YINCEN);
ENYAU- = (ENYAU);
CLRYAU- = (CLRYAU);
LSTROW- = (LSTROW);
SCNDROW- = (SCNDROW);
FRSTROW- = (FRSTROW);
LSTROW_1- = (LSTROW_1);
YINT- = (YINT);
CP- = (CP);
HLD- = (HLD);
HLD- = (HLD);
HLD- = (HLD);
DCR_- = (DCR_);
DCR_- = (DCR_);
M-0 = (NC/1/);
M-1 = (NC/0/);
ACC-.22 = (ACC.22);
ACC-.21 = (ACC.21);
ACC-.20 = (ACC.20);
ACC-.19 = (ACC.19);
ACC-.18 = (ACC.18);
ACC-.17 = (ACC.17);
ACC-.16 = (ACC.16);
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
ACC-.3 = (ACC.3);
ACC-.2 = (ACC.2);
ACC-.1 = (ACC.1);
ACC-.0 = (ACC.0);
ACC-.22 = (ACC.22);
ACC-.21 = (ACC.21);
ACC-.20 = (ACC.20);
ACC-.19 = (ACC.19);
ACC-.18 = (ACC.18);
ACC-.17 = (ACC.17);
ACC-.16 = (ACC.16);
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
```

```
ACC-.3 = (ACC.3);
ACC-.2 = (ACC.2);
ACC-.1 = (ACC.1);
ACC-.0 = (ACC.0);
ACC-.22 = (ACC.22);
ACC-.21 = (ACC.21);
ACC-.20 = (ACC.20);
ACC-.19 = (ACC.19);
ACC-.18 = (ACC.18);
ACC-.17 = (ACC.17);
ACC-.16 = (ACC.16);
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
ACC-.3 = (ACC.3);
ACC-.2 = (ACC.2);
ACC-.1 = (ACC.1);
ACC-.0 = (ACC.0);
CP- = (CP);
CP- = (CP);
CP- = (CP);
COF_ADR-.2 = (COF_ADR.2);
COF_ADR-.1 = (COF_ADR.1);
COF_ADR-.0 = (COF_ADR.0);
S_MODE- = (S_MODE);
S_MODE- = (S_MODE);
CLR_- = (CLR_);
CLR_- = (CLR_);
BRESET_- = (BRESET_);
RESET_- = (RESET_);
BRESET_- = (BRESET_);
BRESET_- = (BRESET_);
SCNIN- = (SCNIN);


/* part instances ***************************/

U7(U7.Z-=Z) = OR2B(U7.A-=A,U7.B-=B);
U9(U9.Z-.22=Z.22,U9.Z-.21=Z.21,U9.Z-.20=Z.20,U9.Z-.19=Z.19,
        U9.Z-.18=Z.18,U9.Z-.17=Z.17,U9.Z-.16=Z.16,U9.Z-.15=Z.15,
        U9.Z-.14=Z.14,U9.Z-.13=Z.13,U9.Z-.12=Z.12,U9.Z-.11=Z.11,
        U9.Z-.10=Z.10,U9.Z-.9=Z.9,U9.Z-.8=Z.8,U9.Z-.7=Z.7,
        U9.Z-.6=Z.6,U9.Z-.5=Z.5,U9.Z-.4=Z.4,U9.Z-.3=Z.3,
        U9.Z-.2=Z.2,U9.Z-.1=Z.1,U9.Z-.0=Z.0) = MUX2X1W23(
        U10.Q-.22=A.22,U10.Q-.21=A.21,U10.Q-.20=A.20,
        U10.Q-.19=A.19,U10.Q-.18=A.18,U10.Q-.17=A.17,
        U10.Q-.16=A.16,U10.Q-.15=A.15,U10.Q-.14=A.14,
        U10.Q-.13=A.13,U10.Q-.12=A.12,U10.Q-.11=A.11,
        U10.Q-.10=A.10,U10.Q-.9=A.9,U10.Q-.8=A.8,U10.Q-.7=A.7,
        U10.Q-.6=A.6,U10.Q-.5=A.5,U10.Q-.4=A.4,U10.Q-.3=A.3,
        U10.Q-.2=A.2,U10.Q-.1=A.1,U10.Q-.0=A.0,DCR_-=S,
        U9.B-.22=B.22,U9.B-.21=B.21,U9.B-.20=B.20,U9.B-.19=B.19,
        U9.B-.18=B.18,U9.B-.17=B.17,U9.B-.16=B.16,U9.B-.15=B.15,
        U9.B-.14=B.14,U9.B-.13=B.13,U9.B-.12=B.12,U9.B-.11=B.11,
        U9.B-.10=B.10,U9.B-.9=B.9,U9.B-.8=B.8,U9.B-.7=B.7,
        U9.B-.6=B.6,U9.B-.5=B.5,U9.B-.4=B.4,U9.B-.3=B.3,
        U9.B-.2=B.2,U9.B-.1=B.1,U9.B-.0=B.0);
U8(ACC-.22=S.22,ACC-.21=S.21,ACC-.20=S.20,ACC-.19=S.19,ACC-.18=S.18,
        ACC-.17=S.17,ACC-.16=S.16,ACC-.15=S.15,ACC-.14=S.14,
        ACC-.13=S.13,ACC-.12=S.12,ACC-.11=S.11,ACC-.10=S.10,
        ACC-.9=S.9,ACC-.8=S.8,ACC-.7=S.7,ACC-.6=S.6,ACC-.5=S.5,
        ACC-.4=S.4,ACC-.3=S.3,ACC-.2=S.2,ACC-.1=S.1,ACC-.0=S.0)
         = ADD23F(U0.Q-.22=B.22,U0.Q-.21=B.21,U0.Q-.20=B.20,
        U0.Q-.19=B.19,U0.Q-.18=B.18,U0.Q-.17=B.17,U0.Q-.16=B.16,
        U0.Q-.15=B.15,U0.Q-.14=B.14,U0.Q-.13=B.13,U0.Q-.12=B.12,
```

```
        U0.Q-.11=B.11,U0.Q-.10=B.10,U0.Q-.9=B.9,U0.Q-.8=B.8,
        U0.Q-.7=B.7,U0.Q-.6=B.6,U0.Q-.5=B.5,U0.Q-.4=B.4,
        U0.Q-.3=B.3,U0.Q-.2=B.2,U0.Q-.1=B.1,U0.Q-.0=B.0,
        U9.Z-.22=A.22,U9.Z-.21=A.21,U9.Z-.20=A.20,U9.Z-.19=A.19,
        U9.Z-.18=A.18,U9.Z-.17=A.17,U9.Z-.16=A.16,U9.Z-.15=A.15,
        U9.Z-.14=A.14,U9.Z-.13=A.13,U9.Z-.12=A.12,U9.Z-.11=A.11,
        U9.Z-.10=A.10,U9.Z-.9=A.9,U9.Z-.8=A.8,U9.Z-.7=A.7,
        U9.Z-.6=A.6,U9.Z-.5=A.5,U9.Z-.4=A.4,U9.Z-.3=A.3,
        U9.Z-.2=A.2,U9.Z-.1=A.1,U9.Z-.0=A.0);
U0.22(U0.Q-.22=Q) = FD2SA(CP-=CP,HLD-=TE,ACC-.22=D,CLR_-=CD,
        U0.Q-.22=TI);
U0.21(U0.Q-.21=Q) = FD2SA(CP-=CP,HLD-=TE,ACC-.21=D,CLR_-=CD,
        U0.Q-.21=TI);
U0.20(U0.Q-.20=Q) = FD2SA(CP-=CP,HLD-=TE,ACC-.20=D,CLR_-=CD,
        U0.Q-.20=TI);
U0.19(U0.Q-.19=Q) = FD2SA(CP-=CP,HLD-=TE,ACC-.19=D,CLR_-=CD,
        U0.Q-.19=TI);
U0.18(U0.Q-.18=Q) = FD2SA(CP-=CP,HLD-=TE,ACC-.18=D,CLR_-=CD,
        U0.Q-.18=TI);
U0.17(U0.Q-.17=Q) = FD2SA(CP-=CP,HLD-=TE,ACC-.17=D,CLR_-=CD,
        U0.Q-.17=TI);
U0.16(U0.Q-.16=Q) = FD2SA(CP-=CP,HLD-=TE,ACC-.16=D,CLR_-=CD,
        U0.Q-.16=TI);
U0.15(U0.Q-.15=Q) = FD2SA(CP-=CP,HLD-=TE,ACC-.15=D,CLR_-=CD,
        U0.Q-.15=TI);
U0.14(U0.Q-.14=Q) = FD2SA(CP-=CP,HLD-=TE,ACC-.14=D,CLR_-=CD,
        U0.Q-.14=TI);
U0.13(U0.Q-.13=Q) = FD2SA(CP-=CP,HLD-=TE,ACC-.13=D,CLR_-=CD,
        U0.Q-.13=TI);
U0.12(U0.Q-.12=Q) = FD2SA(CP-=CP,HLD-=TE,ACC-.12=D,CLR_-=CD,
        U0.Q-.12=TI);
U0.11(U0.Q-.11=Q) = FD2SA(CP-=CP,HLD-=TE,ACC-.11=D,CLR_-=CD,
        U0.Q-.11=TI);
U0.10(U0.Q-.10=Q) = FD2SA(CP-=CP,HLD-=TE,ACC-.10=D,CLR_-=CD,
        U0.Q-.10=TI);
U0.9(U0.Q-.9=Q) = FD2SA(CP-=CP,HLD-=TE,ACC-.9=D,CLR_-=CD,U0.Q-.9=TI);
U0.8(U0.Q-.8=Q) = FD2SA(CP-=CP,HLD-=TE,ACC-.8=D,CLR_-=CD,U0.Q-.8=TI);
U0.7(U0.Q-.7=Q) = FD2SA(CP-=CP,HLD-=TE,ACC-.7=D,CLR_-=CD,U0.Q-.7=TI);
U0.6(U0.Q-.6=Q) = FD2SA(CP-=CP,HLD-=TE,ACC-.6=D,CLR_-=CD,U0.Q-.6=TI);
U0.5(U0.Q-.5=Q) = FD2SA(CP-=CP,HLD-=TE,ACC-.5=D,CLR_-=CD,U0.Q-.5=TI);
U0.4(U0.Q-.4=Q) = FD2SA(CP-=CP,HLD-=TE,ACC-.4=D,CLR_-=CD,U0.Q-.4=TI);
U0.3(U0.Q-.3=Q) = FD2SA(CP-=CP,HLD-=TE,ACC-.3=D,CLR_-=CD,U0.Q-.3=TI);
U0.2(U0.Q-.2=Q) = FD2SA(CP-=CP,HLD-=TE,ACC-.2=D,CLR_-=CD,U0.Q-.2=TI);
U0.1(U0.Q-.1=Q) = FD2SA(CP-=CP,HLD-=TE,ACC-.1=D,CLR_-=CD,U0.Q-.1=TI);
U0.0(U0.Q-.0=Q) = FD2SA(CP-=CP,HLD-=TE,ACC-.0=D,CLR_-=CD,U0.Q-.0=TI);
U4(YINT-=Z) = OR2C(U5.Z-=A,CP-=B);
U5(U5.Z-=Z) = N1B(U2.CE-=A);
U2(EOR-=EOR,INCY-=INCY,YINTSND-=YINTSND,DCR_-=DCR_,HLD-=HLD,
        U2.RST_-=RST_,U2.CE-=CE,U2.RLD-=RLD,U2.CLD-=CLD) =
        YAUCNTV4FN(LS_1-=LS_1,LIM-=LIM,BRESET_-=RESET_,CP-=CP,
        YINCEN-=YINCEN,ENYAU-=ENYAU,CLRYAU-=CLRYAU,LSTROW-=LR,
        SCNDROW-=SR,FRSTROW-=FR,U1.Z-=YINT,U7.Z-=YINT_1,
        LSTROW_1-=LR_1);
U1(U1.Z-=Z) = OR3B(U1.A-=A,U7.A-=B,U7.B-=C);
U15(U15.Y-.2=Y.2,U15.Y-.1=Y.1,U15.Y-.0=Y.0) = INCR3(RND_EN-=EN,
        U15.CIN-=CIN,U15.A-.2=A.2,U15.A-.1=A.1,U15.A-.0=A.0);
U12.2(COF_ADR-.2=Z) = N1C(U13.Z-.2=A);
U12.1(COF_ADR-.1=Z) = N1C(U13.Z-.1=A);
U12.0(COF_ADR-.0=Z) = N1C(U13.Z-.0=A);
U13.2(U13.Z-.2=Z) = MX21LB(U15.Y-.2=A,S_MODE-=S,U3.COF_ADR-.2=B);
U13.1(U13.Z-.1=Z) = MX21LB(U15.Y-.1=A,S_MODE-=S,U3.COF_ADR-.1=B);
U13.0(U13.Z-.0=Z) = MX21LB(U15.Y-.0=A,S_MODE-=S,U3.COF_ADR-.0=B);
U3(ROW_ORDER-.2=ROW_ORDER.2,ROW_ORDER-.1=ROW_ORDER.1,
        ROW_ORDER-.0=ROW_ORDER.0,BMYL-.4=BMYL.4,BMYL-.3=BMYL.3,
        BMYL-.2=BMYL.2,BMYL-.1=BMYL.1,BMYL-.0=BMYL.0,
        U3.COF_ADR-.2=COF_ADR.2,U3.COF_ADR-.1=COF_ADR.1,
        U3.COF_ADR-.0=COF_ADR.0) = BMYLCV2(CLR_-=RESET_,CP-=CP,
        U2.CLD-=CLD,U2.RLD-=RLD,U2.CE-=UPDT,U3.FD-.2=FD.2,
        U3.FD-.1=FD.1,U3.FD-.0=FD.0,HLD-=HLD,NOL-.2=NOL.2,
        NOL-.1=NOL.1,NOL-.0=NOL.0,YUP-=CU,YDWN-=CD,S_MODE-=S_MODE);
U6(CLR_-=Z) = AND2B(U2.RST_-=B,BRESET_-=A);
U14(BRESET_-=Z) = B3A(RESET_-=A);
U10(U10.Q-.22=Q.22,U10.Q-.21=Q.21,U10.Q-.20=Q.20,U10.Q-.19=Q.19,
        U10.Q-.18=Q.18,U10.Q-.17=Q.17,U10.Q-.16=Q.16,
```

```
U10.Q-.15=Q.15,U10.Q-.14=Q.14,U10.Q-.13=Q.13,
U10.Q-.12=Q.12,U10.Q-.11=Q.11,U10.Q-.10=Q.10,U10.Q-.9=Q.9,
U10.Q-.8=Q.8,U10.Q-.7=Q.7,U10.Q-.6=Q.6,U10.Q-.5=Q.5,
U10.Q-.4=Q.4,U10.Q-.3=Q.3,U10.Q-.2=Q.2,U10.Q-.1=Q.1,
U10.Q-.0=Q.0) = REG23(PDI-.15=PDI.15,PDI-.14=PDI.14,
PDI-.13=PDI.13,PDI-.12=PDI.12,PDI-.11=PDI.11,PDI-.10=PDI.10,
PDI-.9=PDI.9,PDI-.8=PDI.8,PDI-.7=PDI.7,PDI-.6=PDI.6,
PDI-.5=PDI.5,PDI-.4=PDI.4,PDI-.3=PDI.3,PDI-.2=PDI.2,
PDI-.1=PDI.1,PDI-.0=PDI.0,DH_CS_-=DH_CS_,DL_CS_-=DL_CS_,
SCNIN-=SCNIN,TEST-=TEST,WR_-=CP,BRESET_-=RESET_);

  /* extractors ******************************/

    U0.Q-.16 = (U15.CIN-);
    U0.Q-.20 = (U1.A-);
    U0.Q-.22 = (U7.B-);
    U9.B-.20 = (M-0);
    U9.B-.22 = (M-0);
    U9.B-.21 = (M-0);
    U9.B-.0 = (M-1);
    U9.B-.9 = (M-1);
    U9.B-.1 = (M-1);
    U9.B-.5 = (M-1);
    U9.B-.16 = (M-1);
    U9.B-.18 = (M-1);
    U9.B-.7 = (M-1);
    U9.B-.15 = (M-1);
    U9.B-.8 = (M-1);
    U9.B-.11 = (M-1);
    U9.B-.4 = (M-1);
    U9.B-.12 = (M-1);
    U9.B-.2 = (M-1);
    U9.B-.13 = (M-1);
    U9.B-.14 = (M-1);
    U9.B-.10 = (M-1);
    U9.B-.3 = (M-1);
    U9.B-.19 = (M-1);
    U9.B-.6 = (M-1);
    U9.B-.17 = (M-1);
    ACC-.19 = (U3.FD-.2);
    ACC-.18 = (U3.FD-.1);
    ACC-.17 = (U3.FD-.0);
    U0.Q-.21 = (U7.A-);
    U0.Q-.19 = (U15.A-.2);
    U0.Q-.18 = (U15.A-.1);
    U0.Q-.17 = (U15.A-.0);

  /* type converters *********************/

ANNOTATIONS
{
  BUS BUS_TYPE = "DOT";
}

END MODULE;



/* * * * * * *  Contents of NET file ADLY.NET  * * * * * * */

/*******************************************************/
/*  Netlist copyright (C) 1989 LSI Logic Corporation   */
/*******************************************************/


MODULE ADLY;

INPUTS      CP,D,DLY_POL,NOS.1,NOS.0,RESET_,WAIT;
OUTPUTS     QD;

LEVEL FUNCTION;
DEFINE
  /* implicit connectors *******************/
```

```
CP- = (CP);
RESET_- = (RESET_);
WAIT- = (WAIT);
D- = (D);
DLY_POL- = (DLY_POL);
QD- = (QD);
NOS-.1 = (NOS.1);
NOS-.0 = (NOS.0);
D- = (D);


/* part instances ***************************/

U2(U2.Z-=Z) = B3A(WAIT-=A);
U1.17(U1.Q-.17=Q) = FD2SA(U1.D-.17=D,U1.Q-.17=TI,CP-=CP,RESET_-=CD,
        U2.Z-=TE);
U1.16(U1.Q-.16=Q) = FD2SA(U1.D-.16=D,U1.Q-.16=TI,CP-=CP,RESET_-=CD,
        U2.Z-=TE);
U1.15(U1.Q-.15=Q) = FD2SA(U1.D-.15=D,U1.Q-.15=TI,CP-=CP,RESET_-=CD,
        U2.Z-=TE);
U1.14(U1.Q-.14=Q) = FD2SA(U1.D-.14=D,U1.Q-.14=TI,CP-=CP,RESET_-=CD,
        U2.Z-=TE);
U1.13(U1.Q-.13=Q) = FD2SA(U1.D-.13=D,U1.Q-.13=TI,CP-=CP,RESET_-=CD,
        U2.Z-=TE);
U1.12(U1.Q-.12=Q) = FD2SA(U1.D-.12=D,U1.Q-.12=TI,CP-=CP,RESET_-=CD,
        U2.Z-=TE);
U1.11(U1.Q-.11=Q) = FD2SA(U1.D-.11=D,U1.Q-.11=TI,CP-=CP,RESET_-=CD,
        U2.Z-=TE);
U1.10(U1.Q-.10=Q) = FD2SA(U1.D-.10=D,U1.Q-.10=TI,CP-=CP,RESET_-=CD,
        U2.Z-=TE);
U1.9(U1.Q-.9=Q) = FD2SA(U1.D-.9=D,U1.Q-.9=TI,CP-=CP,RESET_-=CD,
        U2.Z-=TE);
U1.8(U1.Q-.8=Q) = FD2SA(U1.D-.8=D,U1.Q-.8=TI,CP-=CP,RESET_-=CD,
        U2.Z-=TE);
U1.7(U1.Q-.7=Q) = FD2SA(U1.D-.7=D,U1.Q-.7=TI,CP-=CP,RESET_-=CD,
        U2.Z-=TE);
U1.6(U1.Q-.6=Q) = FD2SA(U1.D-.6=D,U1.Q-.6=TI,CP-=CP,RESET_-=CD,
        U2.Z-=TE);
U1.5(U1.Q-.5=Q) = FD2SA(U1.D-.5=D,U1.Q-.5=TI,CP-=CP,RESET_-=CD,
        U2.Z-=TE);
U1.4(U1.Q-.4=Q) = FD2SA(U1.D-.4=D,U1.Q-.4=TI,CP-=CP,RESET_-=CD,
        U2.Z-=TE);
U1.3(U1.Q-.3=Q) = FD2SA(U1.D-.3=D,U1.Q-.3=TI,CP-=CP,RESET_-=CD,
        U2.Z-=TE);
U1.2(U1.Q-.2=Q) = FD2SA(U1.D-.2=D,U1.Q-.2=TI,CP-=CP,RESET_-=CD,
        U2.Z-=TE);
U1.1(U1.Q-.1=Q) = FD2SA(U1.D-.1=D,U1.Q-.1=TI,CP-=CP,RESET_-=CD,
        U2.Z-=TE);
U1.0(U1.Q-.0=Q) = FD2SA(U1.D-.0=D,U1.Q-.0=TI,CP-=CP,RESET_-=CD,
        U2.Z-=TE);
U0(QD-=Z) = MUX81HB(D-=D1,U0.D2-=D2,U0.D3-=D3,U0.D4-=D4,U0.D5-=D5,
        U0.D6-=D6,U0.D7-=D7,D-=D0,DLY_POL-=A,U0.B-=B,U0.C-=C);


/* extractors *****************************/

U1.Q-.5 = (U0.D3-);
U1.Q-.8 = (U0.D4-);
U1.Q-.11 = (U0.D5-);
U1.Q-.13 = (U0.D6-);
U1.Q-.17 = (U0.D7-);
NOS-.0 = (U0.B-);
NOS-.1 = (U0.C-);
U1.Q-.3 = (U0.D2-);
U1.Q-.16 = (M-0.16);
U1.Q-.15 = (M-0.15);
U1.Q-.14 = (M-0.14);
U1.Q-.13 = (M-0.13);
U1.Q-.12 = (M-0.12);
U1.Q-.11 = (M-0.11);
U1.Q-.10 = (M-0.10);
U1.Q-.9 = (M-0.9);
U1.Q-.8 = (M-0.8);
U1.Q-.7 = (M-0.7);
```

```
    U1.Q-.6 = (M-0.6);
    U1.Q-.5 = (M-0.5);
    U1.Q-.4 = (M-0.4);
    U1.Q-.3 = (M-0.3);
    U1.Q-.2 = (M-0.2);
    U1.Q-.1 = (M-0.1);
    U1.Q-.0 = (M-0.0);
    U1.D-.17 = (M-0.16);
    U1.D-.16 = (M-0.15);
    U1.D-.15 = (M-0.14);
    U1.D-.14 = (M-0.13);
    U1.D-.13 = (M-0.12);
    U1.D-.12 = (M-0.11);
    U1.D-.11 = (M-0.10);
    U1.D-.10 = (M-0.9);
    U1.D-.9 = (M-0.8);
    U1.D-.8 = (M-0.7);
    U1.D-.7 = (M-0.6);
    U1.D-.6 = (M-0.5);
    U1.D-.5 = (M-0.4);
    U1.D-.4 = (M-0.3);
    U1.D-.3 = (M-0.2);
    U1.D-.2 = (M-0.1);
    U1.D-.1 = (M-0.0);
    U1.D-.0 = (D-);

  /* type converters *********************/

ANNOTATIONS
{
  BUS BUS_TYPE = "DOT";
}

END MODULE;


/* * * * * * *  Contents of NET file D3.NET  * * * * * * */

/*****************************************************/
/*  Netlist copyright (C) 1989 LSI Logic Corporation  */
/*****************************************************/


MODULE D3;

INPUTS      CP,D.2,D.1,D.0,HOLD,RESET_;
OUTPUTS     Q.2,Q.1,Q.0;

LEVEL FUNCTION;
DEFINE
  /* implicit connectors *******************/

    Q-.2 = (Q.2);
    Q-.1 = (Q.1);
    Q-.0 = (Q.0);
    CP- = (CP);
    D-.2 = (D.2);
    D-.1 = (D.1);
    D-.0 = (D.0);
    RESET_- = (RESET_);
    HOLD- = (HOLD);

  /* part instances ***********************/

    U0.2(Q-.2=Q) = FD2SA(Q-.2=TI,CP-=CP,HOLD-=TE,D-.2=D,RESET_-=CD);
    U0.1(Q-.1=Q) = FD2SA(Q-.1=TI,CP-=CP,HOLD-=TE,D-.1=D,RESET_-=CD);
    U0.0(Q-.0=Q) = FD2SA(Q-.0=TI,CP-=CP,HOLD-=TE,D-.0=D,RESET_-=CD);

  /* extractors ***************************/
```

```
  /* type converters *********************/

ANNOTATIONS
{
  BUS BUS_TYPE = "DOT";
}

END MODULE;


/* * * * * * *  Contents of NET file SFIFO8X4.NET  * * * * * * */

/******************************************************/
/*  Netlist copyright (C) 1989 LSI Logic Corporation  */
/******************************************************/


MODULE SFIFO8X4;

INPUTS      CP,DI.2,DI.1,DI.0,POP,PUSH,RESET_,WAIT;
OUTPUTS     DO.2,DO.1,DO.0;

LEVEL FUNCTION;
DEFINE
  /* implicit connectors *******************/

    POP- = (POP);
    BRESET_- = (BRESET_);
    CP- = (CP);
    DO-.2 = (DO.2);
    DO-.1 = (DO.1);
    DO-.0 = (DO.0);
    DI-.2 = (DI.2);
    DI-.1 = (DI.1);
    DI-.0 = (DI.0);
    BRESET_- = (BRESET_);
    RESET_- = (RESET_);
    BRESET_- = (BRESET_);
    BRESET_- = (BRESET_);
    CP- = (CP);
    PUSH- = (PUSH);
    WAIT- = (WAIT);
    WAIT- = (WAIT);
    CP- = (CP);


  /* part instances ***************************/

    U7.2(DO-.2=Z) = MUX81HB(U7.A-.0=A,U7.B-.0=B,U7.C-.0=C,U7.D0-.2=D0,
            U7.D1-.2=D1,U7.D2-.2=D2,U7.D3-.2=D3,U7.D4-.2=D4,
            U7.D5-.2=D5,U7.D6-.2=D6,U7.D7-.2=D7);
    U7.1(DO-.1=Z) = MUX81HB(U7.A-.0=A,U7.B-.0=B,U7.C-.0=C,U7.D0-.1=D0,
            U7.D1-.1=D1,U7.D2-.1=D2,U7.D3-.1=D3,U7.D4-.1=D4,
            U7.D5-.1=D5,U7.D6-.1=D6,U7.D7-.1=D7);
    U7.0(DO-.0=Z) = MUX81HB(U7.A-.0=A,U7.B-.0=B,U7.C-.0=C,U7.D0-.0=D0,
            U7.D1-.0=D1,U7.D2-.0=D2,U7.D3-.0=D3,U7.D4-.0=D4,
            U7.D5-.0=D5,U7.D6-.0=D6,U7.D7-.0=D7);
    U3.7(U3.Q-.7.2=Q.2,U3.Q-.7.1=Q.1,U3.Q-.7.0=Q.0) = D3(BRESET_-=RESET_,
            U0.ZN-.7=HOLD,CP-=CP,DI-.2=D.2,DI-.1=D.1,DI-.0=D.0);
    U3.6(U3.Q-.6.2=Q.2,U3.Q-.6.1=Q.1,U3.Q-.6.0=Q.0) = D3(BRESET_-=RESET_,
            U0.ZN-.6=HOLD,CP-=CP,DI-.2=D.2,DI-.1=D.1,DI-.0=D.0);
    U3.5(U3.Q-.5.2=Q.2,U3.Q-.5.1=Q.1,U3.Q-.5.0=Q.0) = D3(BRESET_-=RESET_,
            U0.ZN-.5=HOLD,CP-=CP,DI-.2=D.2,DI-.1=D.1,DI-.0=D.0);
    U3.4(U3.Q-.4.2=Q.2,U3.Q-.4.1=Q.1,U3.Q-.4.0=Q.0) = D3(BRESET_-=RESET_,
            U0.ZN-.4=HOLD,CP-=CP,DI-.2=D.2,DI-.1=D.1,DI-.0=D.0);
    U3.3(U3.Q-.3.2=Q.2,U3.Q-.3.1=Q.1,U3.Q-.3.0=Q.0) = D3(BRESET_-=RESET_,
            U0.ZN-.3=HOLD,CP-=CP,DI-.2=D.2,DI-.1=D.1,DI-.0=D.0);
    U3.2(U3.Q-.2.2=Q.2,U3.Q-.2.1=Q.1,U3.Q-.2.0=Q.0) = D3(BRESET_-=RESET_,
            U0.ZN-.2=HOLD,CP-=CP,DI-.2=D.2,DI-.1=D.1,DI-.0=D.0);
    U3.1(U3.Q-.1.2=Q.2,U3.Q-.1.1=Q.1,U3.Q-.1.0=Q.0) = D3(BRESET_-=RESET_,
            U0.ZN-.1=HOLD,CP-=CP,DI-.2=D.2,DI-.1=D.1,DI-.0=D.0);
    U3.0(U3.Q-.0.2=Q.2,U3.Q-.0.1=Q.1,U3.Q-.0.0=Q.0) = D3(BRESET_-=RESET_,
            U0.ZN-.0=HOLD,CP-=CP,DI-.2=D.2,DI-.1=D.1,DI-.0=D.0);
```

```
U8(BRESET_--Z) = B3A(RESET_--A);
U1(U1.Z--Z) = AND2B(PUSH--A,U4.Z--B);
U2(U2.Q-.2=Q.2,U2.Q-.1=Q.1,U2.Q-.0=Q.0) = CNT3(BRESET_--RESET_,
        CP--CP,U1.Z--CE);
U0(U0.ZN-.7=ZN.7,U0.ZN-.6=ZN.6,U0.ZN-.5=ZN.5,U0.ZN-.4=ZN.4,
        U0.ZN-.3=ZN.3,U0.ZN-.2=ZN.2,U0.ZN-.1=ZN.1,U0.ZN-.0=ZN.0)
         = DEC3X8(U2.Q-.2=A.2,U2.Q-.1=A.1,U2.Q-.0=A.0,WAIT--GN);
U4(U4.Z--Z) = N1B(WAIT--A);
U5(U5.Z--Z) = AND2B(POP--B,U4.Z--A);
U6(U6.Q-.2=Q.2,U6.Q-.1=Q.1,U6.Q-.0=Q.0) = CNT3(CP--CP,BRESET_--RESET_,
        U5.Z--CE);


/* extractors *****************************/

U6.Q-.1 = (U7.B-.0);
U6.Q-.0 = (U7.A-.0);
U6.Q-.2 = (U7.C-.0);
U3.Q-.0.2 = (U7.D0-.2);
U3.Q-.0.1 = (U7.D0-.1);
U3.Q-.0.0 = (U7.D0-.0);
U3.Q-.1.2 = (U7.D1-.2);
U3.Q-.1.1 = (U7.D1-.1);
U3.Q-.1.0 = (U7.D1-.0);
U3.Q-.3.2 = (U7.D3-.2);
U3.Q-.3.1 = (U7.D3-.1);
U3.Q-.3.0 = (U7.D3-.0);
U3.Q-.4.2 = (U7.D4-.2);
U3.Q-.4.1 = (U7.D4-.1);
U3.Q-.4.0 = (U7.D4-.0);
U3.Q-.5.2 = (U7.D5-.2);
U3.Q-.5.1 = (U7.D5-.1);
U3.Q-.5.0 = (U7.D5-.0);
U3.Q-.6.2 = (U7.D6-.2);
U3.Q-.6.1 = (U7.D6-.1);
U3.Q-.6.0 = (U7.D6-.0);
U3.Q-.7.2 = (U7.D7-.2);
U3.Q-.7.1 = (U7.D7-.1);
U3.Q-.7.0 = (U7.D7-.0);
U3.Q-.2.2 = (U7.D2-.2);
U3.Q-.2.1 = (U7.D2-.1);
U3.Q-.2.0 = (U7.D2-.0);


 /* type converters *********************/

ANNOTATIONS
{
 BUS BUS_TYPE = "DOT";
}

END MODULE;


/* * * * * * *  Contents of NET file DEC3X8.NET  * * * * * * */

/*******************************************************/
/*  Netlist copyright (C) 1989 LSI Logic Corporation  */
/*******************************************************/


MODULE DEC3X8;


INPUTS      A.2,A.1,A.0,GN;
OUTPUTS     ZN.7,ZN.6,ZN.5,ZN.4,ZN.3,ZN.2,ZN.1,ZN.0;

LEVEL FUNCTION;
DEFINE
 /* implicit connectors ******************/

  A-.2 = (A.2);
  A-.1 = (A.1);
  A-.0 = (A.0);
```

```
    ZN-.7 = (ZN.7);
    ZN-.6 = (ZN.6);
    ZN-.5 = (ZN.5);
    ZN-.4 = (ZN.4);
    ZN-.3 = (ZN.3);
    ZN-.2 = (ZN.2);
    ZN-.1 = (ZN.1);
    ZN-.0 = (ZN.0);
    GN- = (GN);

  /* part instances ***************************/

    M___12(M___12.Z-=Z) = ND4B(M___12.B-=B,M___12.A-=A,M___4.Z-=D,
            M___12.C-=C);
    M___5(M___5.Z-=Z) = ND4B(M___3.Z-=A,M___2.Z-=B,M___4.Z-=D,
            M___1.Z-=C);
    M___1(M___1.Z-=Z) = N1B(M___1.A-=A);
    M___7(M___7.Z-=Z) = ND4B(M___3.Z-=A,M___7.B-=B,M___4.Z-=D,
            M___1.Z-=C);
    M___11(M___11.Z-=Z) = ND4B(M___11.B-=B,M___11.A-=A,M___4.Z-=D,
            M___1.Z-=C);
    M___9(M___9.Z-=Z) = ND4B(M___9.A-=A,M___2.Z-=B,M___4.Z-=D,
            M___1.Z-=C);
    M___2(M___2.Z-=Z) = N1B(M___2.A-=A);
    M___10(M___10.Z-=Z) = ND4B(M___10.A-=A,M___2.Z-=B,M___4.Z-=D,
            M___10.C-=C);
    M___6(M___6.Z-=Z) = ND4B(M___3.Z-=A,M___2.Z-=B,M___4.Z-=D,
            M___6.C-=C);
    M___3(M___3.Z-=Z) = N1B(M___3.A-=A);
    M___8(M___8.Z-=Z) = ND4B(M___3.Z-=A,M___8.B-=B,M___4.Z-=D,
            M___8.C-=C);
    M___4(M___4.Z-=Z) = N1D(GN-=A);

  /* extractors ******************************/

    ZN-.3 = (M___8.Z-);
    A-.1 = (M___12.B-);
    A-.2 = (M___12.A-);
    A-.0 = (M___12.C-);
    ZN-.7 = (M___12.Z-);
    A-.2 = (M___10.A-);
    A-.2 = (M___9.A-);
    ZN-.4 = (M___9.Z-);
    ZN-.0 = (M___5.Z-);
    A-.0 = (M___1.A-);
    A-.1 = (M___7.B-);
    ZN-.2 = (M___7.Z-);
    A-.1 = (M___11.B-);
    A-.2 = (M___11.A-);
    ZN-.6 = (M___11.Z-);
    A-.1 = (M___2.A-);
    A-.0 = (M___10.C-);
    ZN-.5 = (M___10.Z-);
    ZN-.1 = (M___6.Z-);
    A-.0 = (M___6.C-);
    A-.2 = (M___3.A-);
    A-.1 = (M___8.B-);
    A-.0 = (M___8.C-);

  /* type converters *********************/

ANNOTATIONS
{
  BUS BUS_TYPE = "DOT";
}

END MODULE;
```

```
/* * * * * * *  Contents of NET file CNT3.NET  * * * * * * */

/*******************************************************/
/*  Netlist copyright (C) 1989 LSI Logic Corporation  */
/*******************************************************/


MODULE CNT3;

INPUTS      CE,CP,RESET_;
OUTPUTS     Q.2,Q.1,Q.0;

LEVEL FUNCTION;
DEFINE
  /* implicit connectors *******************/

    RESET_- = (RESET_);
    Q-.2 = (Q.2);
    Q-.1 = (Q.1);
    Q-.0 = (Q.0);
    CE- = (CE);
    CP- = (CP);


  /* part instances **************************/

    U5(U5.Z-=Z) = B3A(RESET_-=A);
    U3(U3.Q-=Q) = FJK2A(CP-=CP,CE-=J,CE-=K,U5.Z-=CD);
    U1(U1.Q-=Q) = FJK2A(CP-=CP,U5.Z-=CD,U2.Z-=K,U2.Z-=J);
    U2(U2.Z-=Z) = AND3C(CE-=B,U0.Q-=C,U3.Q-=A);
    U4(U4.Z-=Z) = AND2B(U3.Q-=B,CE-=A);
    U0(U0.Q-=Q) = FJK2A(CP-=CP,U5.Z-=CD,U4.Z-=J,U4.Z-=K);


  /* extractors *****************************/

    Q-.1 = (U0.Q-);
    Q-.0 = (U3.Q-);
    Q-.2 = (U1.Q-);


  /* type converters *********************/

ANNOTATIONS
{

  BUS BUS_TYPE = "DOT";
}

END MODULE;


/* * * * * * *  Contents of NET file CMAGV2.NET  * * * * * * */

/*******************************************************/
/*  Netlist copyright (C) 1989 LSI Logic Corporation  */
/*******************************************************/


MODULE CMAGV2;

INPUTS      CMAGEN,CP,DLY_POL,ENXAU,EOC,INT_GT_1IN,NOS.1,NOS.0,
            PXL_EN,RESET_,SPRCYC,S_MODE,WAIT,XCOF_ADR.2,
            XCOF_ADR.1,XCOF_ADR.0,XGT1,YCOF_ADR.2,YCOF_ADR.1,
            YCOF_ADR.0,YCOF_SEL;
OUTPUTS     COF_ADR.3,COF_ADR.2,COF_ADR.1,COF_ADR.0;

LEVEL FUNCTION;
DEFINE
  /* implicit connectors *******************/

    PXL_EN- = (PXL_EN);
    S_MODE- = (S_MODE);
    INT_GT_1IN- = (INT_GT_1IN);
```

```
CMAGEN- = (CMAGEN);
RESET_- = (RESET_);
EOC- = (EOC);
XCOF_ADR-.2 = (XCOF_ADR.2);
XCOF_ADR-.1 = (XCOF_ADR.1);
XCOF_ADR-.0 = (XCOF_ADR.0);
CLEAR_- = (CLEAR_);
CP- = (CP);
CLEAR_- = (CLEAR_);
YCOF_SEL- = (YCOF_SEL);
YCOF_SEL- = (YCOF_SEL);
WAIT- = (WAIT);
CP- = (CP);
DLY_POL- = (DLY_POL);
DLY_POL- = (DLY_POL);
NOS-.1 = (NOS.1);
NOS-.0 = (NOS.0);
NOS-.1 = (NOS.1);
NOS-.0 = (NOS.0);
SPRCYC- = (SPRCYC);
SPRCYC- = (SPRCYC);
WAIT- = (WAIT);
WAIT- = (WAIT);
WAIT- = (WAIT);
WAIT- = (WAIT);
YCOF_ADR-.2 = (YCOF_ADR.2);
YCOF_ADR-.1 = (YCOF_ADR.1);
YCOF_ADR-.0 = (YCOF_ADR.0);
COF_ADR-.3 = (COF_ADR.3);
COF_ADR-.2 = (COF_ADR.2);
COF_ADR-.1 = (COF_ADR.1);
COF_ADR-.0 = (COF_ADR.0);
CP- = (CP);
CP- = (CP);
CLEAR_- = (CLEAR_);
CLEAR_- = (CLEAR_);
ENXAU- = (ENXAU);
ENXAU- = (ENXAU);
XGT1- = (XGT1);


/* part instances **************************/

U12(U12.Z-=Z) = ND3B(PXL_EN-=A,S_MODE-=C,INT_GT_1IN-=B);
U10(U10.Z-=Z) = N1A(RESET_-=A);
U11(CLEAR_-=Z) = NR2B(U10.Z-=B,EOC-=A);
U1(U1.Z-=Z) = N1A(SPRCYC-=A);
U2(U2.QD-=QD) = SRDLY(CLEAR_-=RESET_,CP-=CP,WAIT-=WAIT,DLY_POL-=DLY_POL,
        NOS-.1=NOS.1,NOS-.0=NOS.0,SPRCYC-=D);
U13.3(U13.Z-.3=Z) = MX21LB(WAIT-=S,COF_ADR-.3=B,U13.A-.3=A);
U13.2(U13.Z-.2=Z) = MX21LB(WAIT-=S,COF_ADR-.2=B,U13.A-.2=A);
U13.1(U13.Z-.1=Z) = MX21LB(WAIT-=S,COF_ADR-.1=B,U13.A-.1=A);
U13.0(U13.Z-.0=Z) = MX21LB(WAIT-=S,COF_ADR-.0=B,U13.A-.0=A);
U14.3(U14.Z-.3=Z) = MX21LB(WAIT-=S,COF_ADR-.3=B,U14.A-.3=A);
U14.2(U14.Z-.2=Z) = MX21LB(WAIT-=S,COF_ADR-.2=B,U14.A-.2=A);
U14.1(U14.Z-.1=Z) = MX21LB(WAIT-=S,COF_ADR-.1=B,U14.A-.1=A);
U14.0(U14.Z-.0=Z) = MX21LB(WAIT-=S,COF_ADR-.0=B,U14.A-.0=A);
U7.3(COF_ADR-.3=QN) = FD4SA(CLEAR_-=SD,U14.Z-.3=D,U13.Z-.3=TI,
        YCOF_SEL-=TE,CP-=CP);
U7.2(COF_ADR-.2=QN) = FD4SA(CLEAR_-=SD,U14.Z-.2=D,U13.Z-.2=TI,
        YCOF_SEL-=TE,CP-=CP);
U7.1(COF_ADR-.1=QN) = FD4SA(CLEAR_-=SD,U14.Z-.1=D,U13.Z-.1=TI,
        YCOF_SEL-=TE,CP-=CP);
U7.0(COF_ADR-.0=QN) = FD4SA(CLEAR_-=SD,U14.Z-.0=D,U13.Z-.0=TI,
        YCOF_SEL-=TE,CP-=CP);
U5(U5.QD-=QD) = ADLY(CLEAR_-=RESET_,U4.Z-=D,NOS-.1=NOS.1,NOS-.0=NOS.0,
        DLY_POL-=DLY_POL,WAIT-=WAIT,CP-=CP);
U4(U4.Z-=Z) = OR2B(U2.QD-=A,U9.QN-=B);
U8(U8.Z-=Z) = NR3B(YCOF_SEL-=B,U5.QD-=A,U9.QN-=C);
U6(U6.DO-.2=DO.2,U6.DO-.1=DO.1,U6.DO-.0=DO.0) = SFIFO8X4(
        XCOF_ADR-.2=DI.2,XCOF_ADR-.1=DI.1,XCOF_ADR-.0=DI.0,
        U3.Z-=PUSH,WAIT-=WAIT,CP-=CP,CLEAR_-=RESET_,U8.Z-=POP);
U9(U9.QN-=QN) = FD2A(CMAGEN-=CP,CLEAR_-=CD,ENXAU-=D);
U3(U3.Z-=Z) = AND4C(U12.Z-=D,U1.Z-=C,U0.Z-=B,ENXAU-=A);
U0(U0.Z-=Z) = N1A(XGT1-=A);
```

```
  /* extractors *****************************/

    U13.A-.3 = (YCOF_SEL-);
    U13.A-.2 = (YCOF_ADR-.2);
    U13.A-.1 = (YCOF_ADR-.1);
    U13.A-.0 = (YCOF_ADR-.0);
    U14.A-.2 = (U6.DO-.2);
    U14.A-.1 = (U6.DO-.1);
    U14.A-.0 = (U6.DO-.0);
    U14.A-.3 = (YCOF_SEL-);


  /* type converters *********************/

ANNOTATIONS
{
  BUS BUS_TYPE = "DOT";
}

END MODULE;


/* * * * * * *  Contents of NET file ADD16F1.NET  * * * * * * */

/*****************************************************/
/*  Netlist copyright (C) 1989 LSI Logic Corporation  */
/*****************************************************/


MODULE ADD16F1;

INPUTS       A.15,A.14,A.13,A.12,A.11,A.10,A.9,A.8,A.7,A.6,A.5,A.4,
             A.3,A.2,A.1,A.0,B.15,B.14,B.13,B.12,B.11,B.10,B.9,B.8,
             B.7,B.6,B.5,B.4,B.3,B.2,B.1,B.0;
OUTPUTS      S.16,S.15,S.14,S.13,S.12,S.11,S.10,S.9,S.8,S.7,S.6,
             S.5,S.4,S.3,S.2,S.1,S.0;

LEVEL FUNCTION;
DEFINE
  /* implicit connectors *******************/

    S-.16 = (S.16);
    S-.15 = (S.15);
    S-.14 = (S.14);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.15 = (B.15);
```

```
B-.14 = (B.14);
B-.13 = (B.13);
B-.12 = (B.12);
B-.11 = (B.11);
B-.10 = (B.10);
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);


/* part instances *************************/

U17(U17.Z-=Z) = ND2B(U6.Z-=A,U7.P-=B);
U13(U13.Z-=Z) = N1C(U16.G-=A);
U14(U14.Z-=Z) = N1B(U15.Z-=A);
U15(U15.Z-=Z) = ND2C(U12.Z-=A,U13.Z-=B);
U12(U12.Z-=Z) = ND2C(U16.P-=B,U7.G-=A);
U8(U8.Z-=Z) = AND2B(U7.P-=A,U16.P-=B);
U9(U9.Z-=Z) = ND2B(U6.Z-=A,U8.Z-=B);
U10(U10.Z-=Z) = ND2C(U14.Z-=B,U9.Z-=A);
U1(U1.Z-=Z) = EOC(U0.Z-=B,U10.Z-=A);
U0(U0.Z-=Z) = EOA(U0.B-=B,U0.A-=A);
U5(U5.SUM0-=SUM0,U5.SUM1-=SUM1,U5.SUM2-=SUM2,U5.SUM3-=SUM3,
        U5.G-=G) = ADD23F0_SEL4(U5.B3-=B3,U5.B2-=B2,U5.B1-=B1,
        U5.B0-=B0,U5.A3-=A3,U5.A2-=A2,U5.A1-=A1,U5.A0-=A0);
U2(U2.Z-=Z) = ND2C(U5.G-=A,U4.P-=B);
U4(U4.SUM3-=SUM3,U4.P-=P,U4.G-=G,U4.SUM0-=SUM0,U4.SUM2-=SUM2,
        U4.SUM1-=SUM1) = ADD23F_SEL4(U4.A3-=A3,U4.A2-=A2,U4.A1-=A1,
        U4.A0-=A0,U4.B0-=B0,U4.B3-=B3,U4.B2-=B2,U4.B1-=B1,
        U5.G-=CI);
U3(U3.Z-=Z) = N1C(U4.G-=A);
U6(U6.Z-=Z) = ND2C(U2.Z-=A,U3.Z-=B);
U7(U7.P-=P,U7.G-=G,U7.SUM0-=SUM0,U7.SUM3-=SUM3,U7.SUM2-=SUM2,
        U7.SUM1-=SUM1) = ADD23F_SEL4(U7.A3-=A3,U7.A2-=A2,U7.A1-=A1,
        U7.A0-=A0,U7.B0-=B0,U7.B2-=B2,U7.B1-=B1,U7.B3-=B3,
        U6.Z-=CI);
U18(U18.Z-=Z) = N1A(U7.G-=A);
U19(U19.Z-=Z) = ND2B(U17.Z-=A,U18.Z-=B);
U16(U16.P-=P,U16.G-=G,U16.SUM0-=SUM0,U16.SUM3-=SUM3,U16.SUM2-=SUM2,
        U16.SUM1-=SUM1) = ADD23F_SEL4(U16.B0-=B0,U16.B1-=B1,
        U16.B2-=B2,U0.B-=B3,U16.A2-=A2,U0.A-=A3,U16.A1-=A1,
        U16.A0-=A0,U19.Z-=CI);


/* extractors *****************************/

B-.12 = (U16.B0-);
B-.13 = (U16.B1-);
B-.14 = (U16.B2-);
B-.8 = (U7.B0-);
B-.10 = (U7.B2-);
B-.9 = (U7.B1-);
B-.11 = (U7.B3-);
B-.4 = (U4.B0-);
B-.7 = (U4.B3-);
B-.6 = (U4.B2-);
B-.5 = (U4.B1-);
B-.3 = (U5.B3-);
B-.2 = (U5.B2-);
B-.1 = (U5.B1-);
B-.0 = (U5.B0-);
A-.1 = (U5.A1-);
A-.12 = (U16.A0-);
A-.6 = (U4.A2-);
A-.13 = (U16.A1-);
A-.8 = (U7.A0-);
A-.2 = (U5.A2-);
```

```
    A-.4 = (U4.A0-);
    M-0.5 = (U4.SUM1-);
    M-0.6 = (U4.SUM2-);
    M-0.7 = (U4.SUM3-);
    M-0.15 = (U16.SUM3-);
    M-0.3 = (U5.SUM3-);
    M-0.9 = (U7.SUM1-);
    M-0.10 = (U7.SUM2-);
    M-0.2 = (U5.SUM2-);
    M-0.11 = (U7.SUM3-);
    M-0.13 = (U16.SUM1-);
    M-0.12 = (U16.SUM0-);
    M-0.1 = (U5.SUM1-);
    M-0.4 = (U4.SUM0-);
    M-0.8 = (U7.SUM0-);
    M-0.0 = (U5.SUM0-);
    M-0.14 = (U16.SUM2-);
    S-.15 = (M-0.15);
    S-.14 = (M-0.14);
    S-.13 = (M-0.13);
    S-.12 = (M-0.12);
    S-.11 = (M-0.11);
    S-.10 = (M-0.10);
    S-.9 = (M-0.9);
    S-.8 = (M-0.8);
    S-.7 = (M-0.7);
    S-.6 = (M-0.6);
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    S-.16 = (U1.Z-);
    A-.15 = (U0.A-);
    A-.11 = (U7.A3-);
    A-.5 = (U4.A1-);
    A-.10 = (U7.A2-);
    A-.9 = (U7.A1-);
    A-.7 = (U4.A3-);
    A-.3 = (U5.A3-);
    A-.14 = (U16.A2-);
    A-.0 = (U5.A0-);
    B-.15 = (U0.B-);

  /* type converters *********************/

ANNOTATIONS
{
  BUS BUS_TYPE = "DOT";
}

END MODULE;


/* * * * * * *  Contents of NET file ADDF_SEL2.NET  * * * * * * */

/*******************************************************/
/*  Netlist copyright (C) 1989 LSI Logic Corporation  */
/*******************************************************/

MODULE ADDF_SEL2;

INPUTS      A0,A1,B0,B1,CI;
OUTPUTS     G,P,SUM0,SUM1;

LEVEL FUNCTION;
DEFINE
  /* implicit connectors *******************/

    A0- = (A0);
    B0- = (B0);
    P- = (P);
```

```
    A1- = (A1);
    SUM1- = (SUM1);
    CI- = (CI);
    SUM0- = (SUM0);
    B1- = (B1);
    G- = (G);


  /* part instances **************************/

    U1(U1.Z-=Z) = ND2A(B0-=B,A0-=A);
    U0(U0.Z-=Z) = NR2B(A0-=A,B0-=B);
    U9(U9.Z-=Z) = ENB(U7.Z-=B,U1.Z-=A);
    U12(U12.Z-=Z) = N1D(CI-=A);
    U11(U11.Z-=Z) = N1C(U3.Z-=A);
    U10(SUM0-=Z) = MX21LB(U11.Z-=A,U3.Z-=B,U12.Z-=S);
    U15(SUM1-=Z) = MX21LB(U8.Z-=A,U9.Z-=B,U12.Z-=S);
    U8(U8.Z-=Z) = EOB(U2.Z-=B,U7.Z-=A);
    U6(U6.Z-=Z) = N1C(U5.Z-=A);
    U7(U7.Z-=Z) = ND2C(U4.Z-=A,U6.Z-=B);
    U4(U4.Z-=Z) = ND2C(A1-=A,B1-=B);
    U5(U5.Z-=Z) = NR2B(A1-=A,B1-=B);
    U14(P-=Z) = NR2C(U5.Z-=B,U0.Z-=A);
    U2(U2.Z-=Z) = N1B(U0.Z-=A);
    U3(U3.Z-=Z) = ND2C(U1.Z-=A,U2.Z-=B);
    U13(G-=Z) = AO7C(U4.Z-=C,U5.Z-=B,U1.Z-=A);


  /* extractors ******************************/


  /* type converters *********************/

ANNOTATIONS
{
  BUS BUS_TYPE = "DOT";
}

END MODULE;


/* * * * * * *  Contents of NET file ADDF_SEL1.NET  * * * * * * */

/******************************************************/
/*  Netlist copyright (C) 1989 LSI Logic Corporation  */
/******************************************************/


MODULE ADDF_SEL1;

INPUTS      A0,B0,CI;
OUTPUTS     G,P,SUM0;

LEVEL FUNCTION;
DEFINE
  /* implicit connectors *******************/

    B0- = (B0);
    G- = (G);
    SUM0- = (SUM0);
    CI- = (CI);
    P- = (P);
    A0- = (A0);


  /* part instances **************************/

    U6(G-=Z) = N1C(U1.Z-=A);
    U2(U2.Z-=Z) = N1C(U0.Z-=A);
    U7(U7.Z-=Z) = N1D(CI-=A);
    U3(SUM0-=Z) = MX21LB(U2.Z-=A,U0.Z-=B,U7.Z-=S);
    U0(U0.Z-=Z) = ND2C(U1.Z-=A,P-=B);
    U4(P-=Z) = N1C(U5.Z-=A);
```

```
    U5(U5.Z-=Z) = NR2B(A0-=A,B0-=B);
    U1(U1.Z-=Z) = ND2C(B0-=B,A0-=A);

  /* extractors ******************************/


  /* type converters *********************/

ANNOTATIONS
{
  BUS BUS_TYPE = "DOT";
}

END MODULE;


/* * * * * * *  Contents of NET file ADD18F1.NET  * * * * * * */

/*****************************************************/
/*  Netlist copyright (C) 1989 LSI Logic Corporation  */
/*****************************************************/


MODULE ADD18F1;

INPUTS      A.17,A.16,A.15,A.14,A.13,A.12,A.11,A.10,A.9,A.8,A.7,
            A.6,A.5,A.4,A.3,A.2,A.1,A.0,B.17,B.16,B.15,B.14,B.13,
            B.12,B.11,B.10,B.9,B.8,B.7,B.6,B.5,B.4,B.3,B.2,B.1,
            B.0;
OUTPUTS     S.18,S.17,S.16,S.15,S.14,S.13,S.12,S.11,S.10,S.9,S.8,
            S.7,S.6,S.5,S.4,S.3,S.2,S.1,S.0;

LEVEL FUNCTION;
DEFINE
  /* implicit connectors *******************/

    S-.18 = (S.18);
    S-.17 = (S.17);
    S-.16 = (S.16);
    S-.15 = (S.15);
    S-.14 = (S.14);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    A-.17 = (A.17);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
```

```
A-.0 = (A.0);
B-.17 = (B.17);
B-.16 = (B.16);
B-.15 = (B.15);
B-.14 = (B.14);
B-.13 = (B.13);
B-.12 = (B.12);
B-.11 = (B.11);
B-.10 = (B.10);
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);

/* part instances ***************************/

U13(U13.Z-=Z) = N1C(U16.G-=A);
U1(U1.Z-=Z) = AO6C(U10.Z-=A,U11.P-=B,U11.G-=C);
U20(U20.Z-.0=Z) = EOC(U1.Z-=A,U0.Z-=B);
U3(U3.Z-=Z) = N1C(U4.G-=A);
U6(U6.Z-=Z) = ND2C(U3.Z-=B,U2.Z-=A);
U2(U2.Z-=Z) = ND2C(U4.P-=B,U5.G-=A);
U5(U5.SUM0-=SUM0,U5.SUM1-=SUM1,U5.SUM2-=SUM2,U5.SUM3-=SUM3,
        U5.G-=G) = ADD23F0_SEL4(U5.B3-=B3,U5.B2-=B2,U5.B1-=B1,
        U5.B0-=B0,U5.A3-=A3,U5.A2-=A2,U5.A1-=A1,U5.A0-=A0);
U4(U4.SUM3-=SUM3,U4.P-=P,U4.G-=G,U4.SUM0-=SUM0,U4.SUM2-=SUM2,
        U4.SUM1-=SUM1) = ADDF_SEL4(U4.A3-=A3,U4.A2-=A2,U4.A1-=A1,
        U4.A0-=A0,U4.B0-=B0,U4.B3-=B3,U4.B2-=B2,U4.B1-=B1,
        U5.G-=CI);
U0(U0.Z-=Z) = ENA(U11.B1-=B,U11.A1-=A);
U11(U11.SUM1-=SUM1,U11.SUM0-=SUM0,U11.P-=P,U11.G-=G) =
        ADDF_SEL2(U10.Z-=CI,U11.A0-=A0,U11.A1-=A1,U11.B1-=B1,
        U11.B0-=B0);
U16(U16.P-=P,U16.G-=G,U16.SUM0-=SUM0,U16.SUM3-=SUM3,U16.SUM2-=SUM2,
        U16.SUM1-=SUM1) = ADDF_SEL4(U16.A3-=A3,U16.A2-=A2,
        U16.A1-=A1,U16.A0-=A0,U16.B0-=B0,U16.B3-=B3,U16.B2-=B2,
        U16.B1-=B1,U19.Z-=CI);
U18(U18.Z-=Z) = N1A(U7.G-=A);
U19(U19.Z-=Z) = ND2B(U18.Z-=B,U17.Z-=A);
U17(U17.Z-=Z) = ND2B(U7.P-=B,U6.Z-=A);
U8(U8.Z-=Z) = AND2B(U16.P-=B,U7.P-=A);
U12(U12.Z-=Z) = ND2C(U7.G-=A,U16.P-=B);
U14(U14.Z-=Z) = ND2C(U13.Z-=B,U12.Z-=A);
U15(U15.Z-=Z) = N1B(U14.Z-=A);
U10(U10.Z-=Z) = ND2B(U15.Z-=B,U9.Z-=A);
U9(U9.Z-=Z) = ND2B(U8.Z-=B,U6.Z-=A);
U7(U7.P-=P,U7.G-=G,U7.SUM0-=SUM0,U7.SUM3-=SUM3,U7.SUM2-=SUM2,
        U7.SUM1-=SUM1) = ADDF_SEL4(U7.A3-=A3,U7.A2-=A2,U7.A1-=A1,
        U7.A0-=A0,U7.B0-=B0,U7.B2-=B2,U7.B1-=B1,U7.B3-=B3,
        U6.Z-=CI);

/* extractors ******************************/

B-.8 = (U7.B0-);
B-.9 = (U7.B1-);
B-.11 = (U7.B3-);
B-.12 = (U16.B0-);
B-.15 = (U16.B3-);
B-.14 = (U16.B2-);
B-.13 = (U16.B1-);
M-0.9 = (U7.SUM1-);
M-0.15 = (U16.SUM3-);
M-0.8 = (U7.SUM0-);
M-0.10 = (U7.SUM2-);
M-0.14 = (U16.SUM2-);
M-0.11 = (U7.SUM3-);
M-0.12 = (U16.SUM0-);
```

```
    M-0.16 = (U11.SUM0-);
    S-.17 = (M-0.17);
    S-.16 = (M-0.16);
    S-.15 = (M-0.15);
    S-.14 = (M-0.14);
    S-.13 = (M-0.13);
    S-.12 = (M-0.12);
    S-.11 = (M-0.11);
    S-.10 = (M-0.10);
    S-.9 = (M-0.9);
    S-.8 = (M-0.8);
    S-.7 = (M-0.7);
    S-.6 = (M-0.6);
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    S-.18 = (U20.Z-.0);
    A-.15 = (U16.A3-);
    A-.10 = (U7.A2-);
    A-.12 = (U16.A0-);
    A-.13 = (U16.A1-);
    A-.11 = (U7.A3-);
    A-.9 = (U7.A1-);
    A-.14 = (U16.A2-);
    A-.16 = (U11.A0-);
    A-.8 = (U7.A0-);
    M-0.7 = (U4.SUM3-);
    A-.6 = (U4.A2-);
    A-.5 = (U4.A1-);
    A-.4 = (U4.A0-);
    B-.4 = (U4.B0-);
    M-0.4 = (U4.SUM0-);
    B-.7 = (U4.B3-);
    B-.6 = (U4.B2-);
    B-.5 = (U4.B1-);
    M-0.6 = (U4.SUM2-);
    M-0.5 = (U4.SUM1-);
    M-0.0 = (U5.SUM0-);
    M-0.1 = (U5.SUM1-);
    M-0.2 = (U5.SUM2-);
    M-0.3 = (U5.SUM3-);
    B-.3 = (U5.B3-);
    B-.2 = (U5.B2-);
    B-.1 = (U5.B1-);
    B-.0 = (U5.B0-);
    A-.3 = (U5.A3-);
    A-.2 = (U5.A2-);
    A-.1 = (U5.A1-);
    A-.0 = (U5.A0-);
    A-.7 = (U4.A3-);
    A-.17 = (U11.A1-);
    B-.17 = (U11.B1-);
    B-.16 = (U11.B0-);
    M-0.17 = (U11.SUM1-);
    M-0.13 = (U16.SUM1-);
    B-.10 = (U7.B2-);

  /* type converters *********************/

ANNOTATIONS
{
  BUS BUS_TYPE = "DOT";
}

END MODULE;

/* * * * * * *  Contents of NET file ADDF0_SEL4.NET  * * * * * * */

/*****************************************************/
/*  Netlist copyright (C) 1989 LSI Logic Corporation  */
/*****************************************************/
```

```
MODULE ADDF0_SEL4;

INPUTS      A0,A1,A2,A3,B0,B1,B2,B3;
OUTPUTS     G,SUM0,SUM1,SUM2,SUM3;


LEVEL FUNCTION;
DEFINE
  /* implicit connectors *******************/

    SUM0- = (SUM0);
    B1- = (B1);
    A1- = (A1);
    B2- = (B2);
    A2- = (A2);
    B3- = (B3);
    A3- = (A3);
    G- = (G);
    SUM3- = (SUM3);
    SUM2- = (SUM2);
    SUM1- = (SUM1);
    A0- = (A0);
    B0- = (B0);


  /* part instances **************************/

    U23(SUM0-=Z) = N1C(U5.Z-=A);
    U1(U1.Z-=Z) = N1B(U8.Z-=A);
    U5(U5.Z-=Z) = ND2B(U1.Z-=B,U13.Z-=A);
    U16(U16.Z-=Z) = ND2C(B1-=B,A1-=A);
    U6(U6.Z-=Z) = NR2C(B1-=B,A1-=A);
    U2(U2.Z-=Z) = N1B(U6.Z-=A);
    U10(U10.Z-=Z) = ND2C(B2-=B,A2-=A);
    U9(U9.Z-=Z) = NR2C(B2-=B,A2-=A);
    U14(U14.Z-=Z) = N1B(U12.Z-=A);
    U15(U15.Z-=Z) = ND2C(B3-=B,A3-=A);
    U12(U12.Z-=Z) = NR2C(B3-=B,A3-=A);
    U26(U26.Z-=Z) = N1C(U4.Z-=A);
    U25(G-=Z) = ND2C(U24.Z-=A,U26.Z-=B);
    U24(U24.Z-=Z) = ND2B(U18.Z-=B,U3.Z-=A);
    U3(U3.Z-=Z) = NR2C(U9.Z-=A,U12.Z-=B);
    U7(U7.Z-=Z) = N1B(U9.Z-=A);
    U20(U20.Z-=Z) = EOB(U10.Z-=A,U17.Z-=B);
    U30(SUM3-=Z) = N1C(U31.Z-=A);
    U31(U31.Z-=Z) = MX21LA(U18.Z-=S,U21.Z-=B,U20.Z-=A);
    U21(U21.Z-=Z) = ENB(U17.Z-=A,U7.Z-=B);
    U17(U17.Z-=Z) = ND2C(U14.Z-=B,U15.Z-=A);
    U4(U4.Z-=Z) = AO7A(U12.Z-=B,U10.Z-=A,U15.Z-=C);
    U11(U11.Z-=Z) = ND2B(U7.Z-=B,U10.Z-=A);
    U19(U19.Z-=Z) = N1B(U11.Z-=A);
    U27(SUM2-=Z) = N1C(U22.Z-=A);
    U22(U22.Z-=Z) = MX21LA(U18.Z-=S,U19.Z-=A,U11.Z-=B);
    U18(U18.Z-=Z) = AO7B(U13.Z-=A,U6.Z-=B,U16.Z-=C);
    U0(U0.Z-=Z) = ND2B(U2.Z-=B,U16.Z-=A);
    U28(SUM1-=Z) = N1C(U29.Z-=A);
    U29(U29.Z-=Z) = ENB(U13.Z-=A,U0.Z-=B);
    U13(U13.Z-=Z) = ND2C(B0-=B,A0-=A);
    U8(U8.Z-=Z) = NR2C(B0-=B,A0-=A);


  /* extractors ******************************/



  /* type converters *********************/

ANNOTATIONS
{

  BUS BUS_TYPE = "DOT";
}

END MODULE;
```

```
/* * * * * * *  Contents of NET file ADDF_SEL4.NET  * * * * * * */

/*******************************************************/
/*  Netlist copyright (C) 1989 LSI Logic Corporation  */
/*******************************************************/


MODULE ADDF_SEL4;

INPUTS      A0,A1,A2,A3,B0,B1,B2,B3,CI;
OUTPUTS     G,P,SUM0,SUM1,SUM2,SUM3;

LEVEL FUNCTION;
DEFINE
  /* implicit connectors *******************/

    CI- = (CI);
    SUM0- = (SUM0);
    A0- = (A0);
    P- = (P);
    A2- = (A2);
    B2- = (B2);
    G- = (G);
    A3- = (A3);
    B3- = (B3);
    SUM3- = (SUM3);
    SUM2- = (SUM2);
    SUM1- = (SUM1);
    B1- = (B1);
    A1- = (A1);
    B0- = (B0);


  /* part instances *************************/

    U14(U14.Z-=Z) = N1D(CI-=A);
    U13(U13.Z-=Z) = N1C(U11.Z-=A);
    U10(U10.Z-=Z) = EOB(U12.Z-=A,U3.Z-=B);
    U21(U21.Z-=Z) = NR2C(B0-=B,A0-=A);
    U3(U3.Z-=Z) = N1B(U21.Z-=A);
    U11(U11.Z-=Z) = ND2B(U3.Z-=B,U25.Z-=A);
    U15(SUM0-=Z) = MX21LB(U13.Z-=A,U14.Z-=S,U11.Z-=B);
    U39(P-=Z) = AND2B(U6.Z-=B,U2.Z-=A);
    U23(U23.Z-=Z) = NR2C(B2-=B,A2-=A);
    U22(U22.Z-=Z) = ND2C(A2-=A,B2-=B);
    U7(G-=Z) = ND2C(U8.Z-=B,U5.Z-=A);
    U8(U8.Z-=Z) = N1C(U9.Z-=A);
    U32(U32.Z-=Z) = ND2C(U28.Z-=A,U31.Z-=B);
    U31(U31.Z-=Z) = N1B(U30.Z-=A);
    U30(U30.Z-=Z) = NR2C(B3-=B,A3-=A);
    U28(U28.Z-=Z) = ND2C(A3-=A,B3-=B);
    U9(U9.Z-=Z) = AO7A(U30.Z-=B,U22.Z-=A,U28.Z-=C);
    U26(U26.Z-=Z) = ND2B(U24.Z-=B,U22.Z-=A);
    U20(U20.Z-=Z) = N1B(U26.Z-=A);
    U36(U36.Z-=Z) = MX21LA(U27.Z-=S,U20.Z-=A,U26.Z-=B);
    U5(U5.Z-=Z) = ND2B(U27.Z-=B,U6.Z-=A);
    U6(U6.Z-=Z) = NR2C(U23.Z-=A,U30.Z-=B);
    U24(U24.Z-=Z) = N1B(U23.Z-=A);
    U33(U33.Z-=Z) = ENB(U32.Z-=A,U24.Z-=B);
    U34(U34.Z-=Z) = EOB(U22.Z-=A,U32.Z-=B);
    U38(U38.Z-=Z) = MX21LA(U27.Z-=S,U33.Z-=B,U34.Z-=A);
    U40(SUM3-=Z) = MX21LB(U37.Z-=A,U38.Z-=B,U14.Z-=S);
    U37(U37.Z-=Z) = MX21LA(U33.Z-=B,U34.Z-=A,U18.Z-=S);
    U19(U19.Z-=Z) = MX21LA(U20.Z-=A,U26.Z-=B,U18.Z-=S);
    U35(SUM2-=Z) = MX21LB(U36.Z-=B,U19.Z-=A,U14.Z-=S);
    U16(SUM1-=Z) = MX21LB(U17.Z-=B,U10.Z-=A,U14.Z-=S);
    U17(U17.Z-=Z) = ENB(U25.Z-=A,U12.Z-=B);
    U12(U12.Z-=Z) = ND2B(U4.Z-=B,U29.Z-=A);
    U4(U4.Z-=Z) = N1B(U0.Z-=A);
    U29(U29.Z-=Z) = ND2C(A1-=A,B1-=B);
    U0(U0.Z-=Z) = NR2C(B1-=B,A1-=A);
    U2(U2.Z-=Z) = NR2C(U21.Z-=B,U0.Z-=A);
    U1(U1.Z-=Z) = N1C(U2.Z-=A);
    U18(U18.Z-=Z) = ND2C(U29.Z-=A,U1.Z-=B);
    U27(U27.Z-=Z) = AO7B(U25.Z-=A,U0.Z-=B,U29.Z-=C);
    U25(U25.Z-=Z) = ND2C(A0-=A,B0-=B);
```

```
  /* extractors ******************************/


  /* type converters *********************/

ANNOTATIONS
{
  BUS BUS_TYPE = "DOT";
}

END MODULE;


/* * * * * * *  Contents of NET file ADD17F1.NET  * * * * * * */

/*******************************************************/
/*  Netlist copyright (C) 1989 LSI Logic Corporation  */
/*******************************************************/


MODULE ADD17F1;

INPUTS      A.16,A.15,A.14,A.13,A.12,A.11,A.10,A.9,A.8,A.7,A.6,
            A.5,A.4,A.3,A.2,A.1,A.0,B.16,B.15,B.14,B.13,B.12,B.11,
            B.10,B.9,B.8,B.7,B.6,B.5,B.4,B.3,B.2,B.1,B.0;
OUTPUTS     S.17,S.16,S.15,S.14,S.13,S.12,S.11,S.10,S.9,S:8,S.7,
            S.6,S.5,S.4,S.3,S.2,S.1,S.0;

LEVEL FUNCTION;
DEFINE
  /* implicit connectors *******************/

    S-.17 = (S.17);
    S-.16 = (S.16);
    S-.15 = (S.15);
    S-.14 = (S.14);
    S-.13 = (S.13);
    S-.12 = (S.12);
    S-.11 = (S.11);
    S-.10 = (S.10);
    S-.9 = (S.9);
    S-.8 = (S.8);
    S-.7 = (S.7);
    S-.6 = (S.6);
    S-.5 = (S.5);
    S-.4 = (S.4);
    S-.3 = (S.3);
    S-.2 = (S.2);
    S-.1 = (S.1);
    S-.0 = (S.0);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.16 = (B.16);
    B-.15 = (B.15);
    B-.14 = (B.14);
    B-.13 = (B.13);
    B-.12 = (B.12);
    B-.11 = (B.11);
    B-.10 = (B.10);
```

```
  B-.9 = (B.9);
  B-.8 = (B.8);
  B-.7 = (B.7);
  B-.6 = (B.6);
  B-.5 = (B.5);
  B-.4 = (B.4);
  B-.3 = (B.3);
  B-.2 = (B.2);
  B-.1 = (B.1);
  B-.0 = (B.0);


/* part instances ***************************/

  U13(U13.Z-=Z) = N1C(U12.G-=A);
  U10(U10.Z-=Z) = ND2C(U12.P-=B,U11.G-=A);
  U9(U9.Z-=Z) = ND2C(U13.Z-=B,U10.Z-=A);
  U17(U17.Z-=Z) = N1B(U1.Z-=A);
  U0(U0.P-=P,U0.G-=G,U0.SUM0-=SUM0,U0.SUM3-=SUM3,U0.SUM2-=SUM2,
          U0.SUM1-=SUM1) = ADDF_SEL4(U0.A3-=A3,U0.A2-=A2,U0.A1-=A1,
          U0.A0-=A0,U0.B0-=B0,U0.B3-=B3,U0.B2-=B2,U0.B1-=B1,
          U5.Z-=CI);
  U4(U4.Z-=Z) = N1C(U0.G-=A);
  U1(U1.Z-=Z) = ND2C(U4.Z-=B,U2.Z-=A);
  U2(U2.Z-=Z) = ND2C(U8.G-=A,U0.P-=B);
  U3(U3.Z-=Z) = AND2B(U8.P-=A,U0.P-=B);
  U6(U6.Z-=Z) = ND2B(U8.P-=B,U9.Z-=A);
  U5(U5.Z-=Z) = ND2B(U7.Z-=B,U6.Z-=A);
  U7(U7.Z-=Z) = N1A(U8.G-=A);
  U8(U8.P-=P,U8.G-=G,U8.SUM0-=SUM0,U8.SUM3-=SUM3,U8.SUM2-=SUM2,
          U8.SUM1-=SUM1) = ADDF_SEL4(U8.A3-=A3,U8.A2-=A2,U8.A1-=A1,
          U8.A0-=A0,U8.B0-=B0,U8.B2-=B2,U8.B1-=B1,U8.B3-=B3,
          U9.Z-=CI);
  U15(U15.Z-=Z) = ND2B(U3.Z-=B,U9.Z-=A);
  U16(U16.Z-=Z) = ND2B(U17.Z-=B,U15.Z-=A);
  U18(U18.Z-=Z) = AO6B(U14.G-=C,U14.P-=B,U16.Z-=A);
  U20(U20.Z-=Z) = EOC(U19.Z-=B,U18.Z-=A);
  U19(U19.Z-=Z) = ENA(U14.B0-=B,U14.A0-=A);
  U14(U14.G-=G,U14.P-=P,U14.SUM0-=SUM0) = ADDF_SEL1(U16.Z-=CI,
          U14.A0-=A0,U14.B0-=B0);
  U12(U12.SUM3-=SUM3,U12.P-=P,U12.G-=G,U12.SUM0-=SUM0,U12.SUM2-=SUM2,
          U12.SUM1-=SUM1) = ADDF_SEL4(U12.A3-=A3,U12.A2-=A2,
          U12.A1-=A1,U12.A0-=A0,U12.B0-=B0,U12.B3-=B3,U12.B2-=B2,
          U12.B1-=B1,U11.G-=CI);
  U11(U11.SUM0-=SUM0,U11.SUM1-=SUM1,U11.SUM2-=SUM2,U11.SUM3-=SUM3,
          U11.G-=G) = ADDF0_SEL4(U11.B3-=B3,U11.B2-=B2,U11.B1-=B1,
          U11.B0-=B0,U11.A3-=A3,U11.A2-=A2,U11.A1-=A1,U11.A0-=A0);


/* extractors ******************************/

  B-.3 = (U11.B3-);
  B-.1 = (U11.B1-);
  B-.0 = (U11.B0-);
  B-.4 = (U12.B0-);
  B-.7 = (U12.B3-);
  B-.6 = (U12.B2-);
  B-.5 = (U12.B1-);
  M-0.0 = (U11.SUM0-);
  M-0.6 = (U12.SUM2-);
  M-0.3 = (U11.SUM3-);
  M-0.1 = (U11.SUM1-);
  M-0.4 = (U12.SUM0-);
  M-0.2 = (U11.SUM2-);
  M-0.7 = (U12.SUM3-);
  S-.16 = (M-0.16);
  S-.15 = (M-0.15);
  S-.14 = (M-0.14);
  S-.13 = (M-0.13);
  S-.12 = (M-0.12);
  S-.11 = (M-0.11);
  S-.10 = (M-0.10);
  S-.9 = (M-0.9);
  S-.8 = (M-0.8);
  S-.7 = (M-0.7);
  S-.6 = (M-0.6);
```

```
    S-.5 = (M-0.5);
    S-.4 = (M-0.4);
    S-.3 = (M-0.3);
    S-.2 = (M-0.2);
    S-.1 = (M-0.1);
    S-.0 = (M-0.0);
    S-.17 = (U20.Z-);
    A-.10 = (U8.A2-);
    A-.5 = (U12.A1-);
    A-.4 = (U12.A0-);
    A-.6 = (U12.A2-);
    A-.8 = (U8.A0-);
    A-.11 = (U8.A3-);
    A-.2 = (U11.A2-);
    A-.3 = (U11.A3-);
    A-.9 = (U8.A1-);
    A-.15 = (U0.A3-);
    A-.13 = (U0.A1-);
    A-.7 = (U12.A3-);
    A-.1 = (U11.A1-);
    A-.0 = (U11.A0-);
    A-.16 = (U14.A0-);
    A-.14 = (U0.A2-);
    A-.12 = (U0.A0-);
    B-.12 = (U0.B0-);
    M-0.12 = (U0.SUM0-);
    B-.15 = (U0.B3-);
    B-.14 = (U0.B2-);
    B-.13 = (U0.B1-);
    M-0.15 = (U0.SUM3-);
    M-0.14 = (U0.SUM2-);
    M-0.13 = (U0.SUM1-);
    B-.8 = (U8.B0-);
    M-0.8 = (U8.SUM0-);
    B-.10 = (U8.B2-);
    B-.9 = (U8.B1-);
    B-.11 = (U8.B3-);
    M-0.11 = (U8.SUM3-);
    M-0.10 = (U8.SUM2-);
    M-0.9 = (U8.SUM1-);
    B-.16 = (U14.B0-);
    M-0.16 = (U14.SUM0-);
    M-0.5 = (U12.SUM1-);
    B-.2 = (U11.B2-);


  /* type converters *********************/

ANNOTATIONS
{
  BUS BUS_TYPE = "DOT";
}

END MODULE;



/* * * * * * *  Contents of NET file ENGN_V3.NET  * * * * * * */

/*******************************************************/
/*  Netlist copyright (C) 1989 LSI Logic Corporation  */
/*******************************************************/


MODULE ENGN_V3;

INPUTS      CD0.11,CD0.10,CD0.9,CD0.8,CD0.7,CD0.6,CD0.5,CD0.4,
            CD0.3,CD0.2,CD0.1,CD0.0,CD1.11,CD1.10,CD1.9,CD1.8,
            CD1.7,CD1.6,CD1.5,CD1.4,CD1.3,CD1.2,CD1.1,CD1.0,
            CD2.11,CD2.10,CD2.9,CD2.8,CD2.7,CD2.6,CD2.5,CD2.4,
            CD2.3,CD2.2,CD2.1,CD2.0,CD3.11,CD3.10,CD3.9,CD3.8,
            CD3.7,CD3.6,CD3.5,CD3.4,CD3.3,CD3.2,CD3.1,CD3.0,
            CD4.11,CD4.10,CD4.9,CD4.8,CD4.7,CD4.6,CD4.5,CD4.4,
            CD4.3,CD4.2,CD4.1,CD4.0,CP,DLY_POL,DUP,FRST_ROW,
            LST_ROW,LST_ROW_1,NOS.1,NOS.0,PDI.12,PDI.11,PDI.10,
            PDI.9,PDI.8,PDI.7,PDI.6,PDI.5,PDI.4,PDI.3,PDI.2,PDI.1,
```

```
            PDI.0,PLR_CS_,RC0.7,RC0.6,RC0.5,RC0.4,RC0.3,RC0.2,
            RC0.1,RC0.0,RC1.7,RC1.6,RC1.5,RC1.4,RC1.3,RC1.2,RC1.1,
            RC1.0,RC2.7,RC2.6,RC2.5,RC2.4,RC2.3,RC2.2,RC2.1,RC2.0,
            RC3.7,RC3.6,RC3.5,RC3.4,RC3.3,RC3.2,RC3.1,RC3.0,RC4.7,
            RC4.6,RC4.5,RC4.4,RC4.3,RC4.2,RC4.1,RC4.0,RESET_,
            ROW_ORDR.2,ROW_ORDR.1,ROW_ORDR.0,S,SCND_ROW,SE,SEL10,
            SEL11,SPR.1,SPR.0,STB_I,S_MODE,TST,WAIT,WR_;
OUTPUTS     CNVL.12,CNVL.11,CNVL.10,CNVL.9,CNVL.8,CNVL.7,CNVL.6,
            CNVL.5,CNVL.4,CNVL.3,CNVL.2,CNVL.1,CNVL.0,PDO2.15,
            PDO2.14,PDO2.13,PDO2.12,PDO2.11,PDO2.10,PDO2.9,PDO2.8,
            PDO2.7,PDO2.6,PDO2.5,PDO2.4,PDO2.3,PDO2.2,PDO2.1,
            PDO2.0;

LEVEL FUNCTION;
DEFINE
  /* implicit connectors *******************/

    LST_ROW- = (LST_ROW);
    LST_ROW_1- = (LST_ROW_1);
    SCND_ROW- = (SCND_ROW);
    FRST_ROW- = (FRST_ROW);
    ROW_ORDR-.2 = (ROW_ORDR.2);
    ROW_ORDR-.1 = (ROW_ORDR.1);
    ROW_ORDR-.0 = (ROW_ORDR.0);
    STB_I- = (STB_I);
    S- = (S);
    BS- = (BS);
    CD1-.11 = (CD1.11);
    CD1-.10 = (CD1.10);
    CD1-.9 = (CD1.9);
    CD1-.8 = (CD1.8);
    CD1-.7 = (CD1.7);
    CD1-.6 = (CD1.6);
    CD1-.5 = (CD1.5);
    CD1-.4 = (CD1.4);
    CD1-.3 = (CD1.3);
    CD1-.2 = (CD1.2);
    CD1-.1 = (CD1.1);
    CD1-.0 = (CD1.0);
    U29.TCYN- = (NC/0/);
    U17.TCYN- = (NC/0/);
    CD3-.11 = (CD3.11);
    CD3-.10 = (CD3.10);
    CD3-.9 = (CD3.9);
    CD3-.8 = (CD3.8);
    CD3-.7 = (CD3.7);
    CD3-.6 = (CD3.6);
    CD3-.5 = (CD3.5);
    CD3-.4 = (CD3.4);
    CD3-.3 = (CD3.3);
    CD3-.2 = (CD3.2);
    CD3-.1 = (CD3.1);
    CD3-.0 = (CD3.0);
    BWAIT0- = (BWAIT0);
    WAIT- = (WAIT);
    BWAIT2- = (BWAIT2);
    CP- = (CP);
    CP- = (CP);
    CP- = (CP);
    CP- = (CP);
    BWAIT0- = (BWAIT0);
    CP- = (CP);
    U30.TCYN- = (NC/0/);
    U16.TCYN- = (NC/0/);
    CD4-.11 = (CD4.11);
    CD4-.10 = (CD4.10);
    CD4-.9 = (CD4.9);
    CD4-.8 = (CD4.8);
    CD4-.7 = (CD4.7);
    CD4-.6 = (CD4.6);
    CD4-.5 = (CD4.5);
    CD4-.4 = (CD4.4);
    CD4-.3 = (CD4.3);
    CD4-.2 = (CD4.2);
    CD4-.1 = (CD4.1);
    CD4-.0 = (CD4.0);
```

```
CP- = (CP);
BRESET0_- = (BRESET0_);
BWAIT4- = (BWAIT4);
BWAIT4- = (BWAIT4);
CP- = (CP);
BRESET0_- = (BRESET0_);
BWAIT3- = (BWAIT3);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
CP- = (CP);
BRESET3_- = (BRESET3_);
BRESET3_- = (BRESET3_);
BRESET2_- = (BRESET2_);
BWAIT2- = (BWAIT2);
CP- = (CP);
SEL11- = (SEL11);
SEL10- = (SEL10);
CP- = (CP);
BWAIT2- = (BWAIT2);
BRESET2_- = (BRESET2_);
U28.TCYN- = (NC/0/);
CD2-.11 = (CD2.11);
CD2-.10 = (CD2.10);
CD2-.9 = (CD2.9);
CD2-.8 = (CD2.8);
CD2-.7 = (CD2.7);
CD2-.6 = (CD2.6);
CD2-.5 = (CD2.5);
CD2-.4 = (CD2.4);
CD2-.3 = (CD2.3);
CD2-.2 = (CD2.2);
CD2-.1 = (CD2.1);
CD2-.0 = (CD2.0);
BRESET2_- = (BRESET2_);
BWAIT0- = (BWAIT0);
CP- = (CP);
BWAIT4- = (BWAIT4);
DLY_POL- = (DLY_POL);
DLY_POL- = (DLY_POL);
NOS-.1 = (NOS.1);
NOS-.0 = (NOS.0);
NOS-.1 = (NOS.1);
NOS-.0 = (NOS.0);
BRESET2_- = (BRESET2_);
CP- = (CP);
SE- = (SE);
DUP- = (DUP);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PLR_CS_- = (PLR_CS_);
WR_- = (WR_);
TST- = (TST);
SPR-.1 = (SPR.1);
SPR-.0 = (SPR.0);
```

```
BS- = (BS);
BS- = (BS);
BS- = (BS);
U28.RND- = (NC/0/);
BRESET3_- = (BRESET3_);
BWAIT1- = (BWAIT1);
CP- = (CP);
CP- = (CP);
BWAIT1- = (BWAIT1);
BWAIT1- = (BWAIT1);
BWAIT1- = (BWAIT1);
BWAIT1- = (BWAIT1);
CP- = (CP);
BRESET1_- = (BRESET1_);
BRESET1_- = (BRESET1_);
BRESET1_- = (BRESET1_);
RESET_- = (RESET_);
BRESET0_- = (BRESET0_);
BRESET1_- = (BRESET1_);
BRESET1_- = (BRESET1_);
M-0 = (NC/0/);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
BRESET2_- = (BRESET2_);
BRESET2_- = (BRESET2_);
BRESET3_- = (BRESET3_);
BRESET3_- = (BRESET3_);
BRESET3_- = (BRESET3_);
BWAIT3- = (BWAIT3);
BWAIT3- = (BWAIT3);
CP- = (CP);
BWAIT4- = (BWAIT4);
BWAIT4- = (BWAIT4);
U16.RND- = (NC/0/);
U17.TCX- = (NC/1/);
CD0-.11 = (CD0.11);
CD0-.10 = (CD0.10);
CD0-.9 = (CD0.9);
CD0-.8 = (CD0.8);
CD0-.7 = (CD0.7);
CD0-.6 = (CD0.6);
CD0-.5 = (CD0.5);
CD0-.4 = (CD0.4);
CD0-.3 = (CD0.3);
CD0-.2 = (CD0.2);
CD0-.1 = (CD0.1);
CD0-.0 = (CD0.0);
U30.RND- = (NC/0/);
BRESET0_- = (BRESET0_);
BRESET0_- = (BRESET0_);
CP- = (CP);
CP- = (CP);
BWAIT2- = (BWAIT2);
BWAIT2- = (BWAIT2);
BWAIT0- = (BWAIT0);
BWAIT0- = (BWAIT0);
U17.RND- = (NC/0/);
U29.RND- = (NC/0/);
BS- = (BS);
BS- = (BS);
RC3-.7 = (RC3.7);
RC3-.6 = (RC3.6);
```

```
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
S_MODE- = (S_MODE);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);


/* part instances ***************************/

U9(BS-=Z) = B3A(S-=A);
U10.4(U10.Z-.4=Z) = B3A(WAIT-=A);
U10.3(U10.Z-.3=Z) = B3A(WAIT-=A);
U10.2(U10.Z-.2=Z) = B3A(WAIT-=A);
U10.1(U10.Z-.1=Z) = B3A(WAIT-=A);
U10.0(U10.Z-.0=Z) = B3A(WAIT-=A);
U18(U18.S-.18=S.18,U18.S-.17=S.17,U18.S-.16=S.16,U18.S-.15=S.15,
        U18.S-.14=S.14,U18.S-.13=S.13,U18.S-.12=S.12,
        U18.S-.11=S.11,U18.S-.10=S.10,U18.S-.9=S.9,U18.S-.8=S.8,
        U18.S-.7=S.7,U18.S-.6=S.6,U18.S-.5=S.5,U18.S-.4=S.4,
        U18.S-.3=S.3,U18.S-.2=S.2,U18.S-.1=S.1,U18.S-.0=S.0)
         = ADD18F1(U21.Q-.17=A.17,U21.Q-.16=A.16,U21.Q-.15=A.15,
        U21.Q-.14=A.14,U21.Q-.13=A.13,U21.Q-.12=A.12,
        U21.Q-.11=A.11,U21.Q-.10=A.10,U21.Q-.9=A.9,U21.Q-.8=A.8,
        U21.Q-.7=A.7,U21.Q-.6=A.6,U21.Q-.5=A.5,U21.Q-.4=A.4,
        U21.Q-.3=A.3,U21.Q-.2=A.2,U21.Q-.1=A.1,U21.Q-.0=A.0,
        U18.B-.17=B.17,U18.B-.16=B.16,U18.B-.15=B.15,
        U18.B-.14=B.14,U18.B-.13=B.13,U18.B-.12=B.12,
        U18.B-.11=B.11,U18.B-.10=B.10,U18.B-.9=B.9,U18.B-.8=B.8,
        U18.B-.7=B.7,U18.B-.6=B.6,U18.B-.5=B.5,U18.B-.4=B.4,
        U18.B-.3=B.3,U18.B-.2=B.2,U18.B-.1=B.1,U18.B-.0=B.0);
U26(U26.S-.16=S.16,U26.S-.15=S.15,U26.S-.14=S.14,U26.S-.13=S.13,
        U26.S-.12=S.12,U26.S-.11=S.11,U26.S-.10=S.10,U26.S-.9=S.9,
        U26.S-.8=S.8,U26.S-.7=S.7,U26.S-.6=S.6,U26.S-.5=S.5,
        U26.S-.4=S.4,U26.S-.3=S.3,U26.S-.2=S.2,U26.S-.1=S.1,
        U26.S-.0=S.0) = ADD16F1(U25.Q-.15=B.15,U25.Q-.14=B.14,
        U25.Q-.13=B.13,U25.Q-.12=B.12,U25.Q-.11=B.11,
        U25.Q-.10=B.10,U25.Q-.9=B.9,U25.Q-.8=B.8,U25.Q-.7=B.7,
        U25.Q-.6=B.6,U25.Q-.5=B.5,U25.Q-.4=B.4,U25.Q-.3=B.3,
        U25.Q-.2=B.2,U25.Q-.1=B.1,U25.Q-.0=B.0,U27.Q-.15=A.15,
        U27.Q-.14=A.14,U27.Q-.13=A.13,U27.Q-.12=A.12,
        U27.Q-.11=A.11,U27.Q-.10=A.10,U27.Q-.9=A.9,U27.Q-.8=A.8,
        U27.Q-.7=A.7,U27.Q-.6=A.6,U27.Q-.5=A.5,U27.Q-.4=A.4,
```

```
        U27.Q-.3=A.3,U27.Q-.2=A.2,U27.Q-.1=A.1,U27.Q-.0=A.0);
U37(U37.Z-.12=Z.12,U37.Z-.11=Z.11,U37.Z-.10=Z.10,U37.Z-.9=Z.9,
        U37.Z-.8=Z.8,U37.Z-.7=Z.7,U37.Z-.6=Z.6,U37.Z-.5=Z.5,
        U37.Z-.4=Z.4,U37.Z-.3=Z.3,U37.Z-.2=Z.2,U37.Z-.1=Z.1,
        U37.Z-.0=Z.0) = MUX2X1W13X8(U36.Q0-.12=D0.12,U36.Q0-.11=D0.11,
        U36.Q0-.10=D0.10,U36.Q0-.9=D0.9,U36.Q0-.8=D0.8,
        U36.Q0-.7=D0.7,U36.Q0-.6=D0.6,U36.Q0-.5=D0.5,
        U36.Q0-.4=D0.4,U36.Q0-.3=D0.3,U36.Q0-.2=D0.2,
        U36.Q0-.1=D0.1,U36.Q0-.0=D0.0,BS-=S,U31.D4-.7=D1.7,
        U31.D4-.6=D1.6,U31.D4-.5=D1.5,U31.D4-.4=D1.4,
        U31.D4-.3=D1.3,U31.D4-.2=D1.2,U31.D4-.1=D1.1,
        U31.D4-.0=D1.0);
U35(U35.Z-.12=Z.12,U35.Z-.11=Z.11,U35.Z-.10=Z.10,U35.Z-.9=Z.9,
        U35.Z-.8=Z.8,U35.Z-.7=Z.7,U35.Z-.6=Z.6,U35.Z-.5=Z.5,
        U35.Z-.4=Z.4,U35.Z-.3=Z.3,U35.Z-.2=Z.2,U35.Z-.1=Z.1,
        U35.Z-.0=Z.0) = MUX2X1W13X8(U36.Q4-.12=D0.12,U36.Q4-.11=D0.11,
        U36.Q4-.10=D0.10,U36.Q4-.9=D0.9,U36.Q4-.8=D0.8,
        U36.Q4-.7=D0.7,U36.Q4-.6=D0.6,U36.Q4-.5=D0.5,
        U36.Q4-.4=D0.4,U36.Q4-.3=D0.3,U36.Q4-.2=D0.2,
        U36.Q4-.1=D0.1,U36.Q4-.0=D0.0,BS-=S,U31.D0-.7=D1.7,
        U31.D0-.6=D1.6,U31.D0-.5=D1.5,U31.D0-.4=D1.4,
        U31.D0-.3=D1.3,U31.D0-.2=D1.2,U31.D0-.1=D1.1,
        U31.D0-.0=D1.0);
U36(U36.Q0-.12=Q0.12,U36.Q0-.11=Q0.11,U36.Q0-.10=Q0.10,
        U36.Q0-.9=Q0.9,U36.Q0-.8=Q0.8,U36.Q0-.7=Q0.7,
        U36.Q0-.6=Q0.6,U36.Q0-.5=Q0.5,U36.Q0-.4=Q0.4,
        U36.Q0-.3=Q0.3,U36.Q0-.2=Q0.2,U36.Q0-.1=Q0.1,
        U36.Q0-.0=Q0.0,U36.Q1-.12=Q1.12,U36.Q1-.11=Q1.11,
        U36.Q1-.10=Q1.10,U36.Q1-.9=Q1.9,U36.Q1-.8=Q1.8,
        U36.Q1-.7=Q1.7,U36.Q1-.6=Q1.6,U36.Q1-.5=Q1.5,
        U36.Q1-.4=Q1.4,U36.Q1-.3=Q1.3,U36.Q1-.2=Q1.2,
        U36.Q1-.1=Q1.1,U36.Q1-.0=Q1.0,U36.Q2-.12=Q2.12,
        U36.Q2-.11=Q2.11,U36.Q2-.10=Q2.10,U36.Q2-.9=Q2.9,
        U36.Q2-.8=Q2.8,U36.Q2-.7=Q2.7,U36.Q2-.6=Q2.6,
        U36.Q2-.5=Q2.5,U36.Q2-.4=Q2.4,U36.Q2-.3=Q2.3,
        U36.Q2-.2=Q2.2,U36.Q2-.1=Q2.1,U36.Q2-.0=Q2.0,
        U36.Q3-.12=Q3.12,U36.Q3-.11=Q3.11,U36.Q3-.10=Q3.10,
        U36.Q3-.9=Q3.9,U36.Q3-.8=Q3.8,U36.Q3-.7=Q3.7,
        U36.Q3-.6=Q3.6,U36.Q3-.5=Q3.5,U36.Q3-.4=Q3.4,
        U36.Q3-.3=Q3.3,U36.Q3-.2=Q3.2,U36.Q3-.1=Q3.1,
        U36.Q3-.0=Q3.0,U36.Q4-.12=Q4.12,U36.Q4-.11=Q4.11,
        U36.Q4-.10=Q4.10,U36.Q4-.9=Q4.9,U36.Q4-.8=Q4.8,
        U36.Q4-.7=Q4.7,U36.Q4-.6=Q4.6,U36.Q4-.5=Q4.5,
        U36.Q4-.4=Q4.4,U36.Q4-.3=Q4.3,U36.Q4-.2=Q4.2,
        U36.Q4-.1=Q4.1,U36.Q4-.0=Q4.0) = PLREGV2(BWAIT4-=WAIT,
        DLY_POL-=DLY_POL,NOS-.1=NOS.1,NOS-.0=NOS.0,BRESET2_-=RESET_,
        CP-=CP,SE-=SE,DUP-=DUP,PDI-.12=PDI.12,PDI-.11=PDI.11,
        PDI-.10=PDI.10,PDI-.9=PDI.9,PDI-.8=PDI.8,PDI-.7=PDI.7,
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,PLR_CS_-=PLR_CS_,
        WR_-=WR_,TST-=TST,SPR-.1=SPR.1,SPR-.0=SPR.0,U0.QD-.12=D.12,
        U0.QD-.11=D.11,U0.QD-.10=D.10,U0.QD-.9=D.9,U0.QD-.8=D.8,
        U0.QD-.7=D.7,U0.QD-.6=D.6,U0.QD-.5=D.5,U0.QD-.4=D.4,
        U0.QD-.3=D.3,U0.QD-.2=D.2,U0.QD-.1=D.1,U0.QD-.0=D.0);
U33(U33.Z-.12=Z.12,U33.Z-.11=Z.11,U33.Z-.10=Z.10,U33.Z-.9=Z.9,
        U33.Z-.8=Z.8,U33.Z-.7=Z.7,U33.Z-.6=Z.6,U33.Z-.5=Z.5,
        U33.Z-.4=Z.4,U33.Z-.3=Z.3,U33.Z-.2=Z.2,U33.Z-.1=Z.1,
        U33.Z-.0=Z.0) = MUX2X1W13X8(U36.Q2-.12=D0.12,U36.Q2-.11=D0.11,
        U36.Q2-.10=D0.10,U36.Q2-.9=D0.9,U36.Q2-.8=D0.8,
        U36.Q2-.7=D0.7,U36.Q2-.6=D0.6,U36.Q2-.5=D0.5,
        U36.Q2-.4=D0.4,U36.Q2-.3=D0.3,U36.Q2-.2=D0.2,
        U36.Q2-.1=D0.1,U36.Q2-.0=D0.0,BS-=S,U31.D2-.7=D1.7,
        U31.D2-.6=D1.6,U31.D2-.5=D1.5,U31.D2-.4=D1.4,
        U31.D2-.3=D1.3,U31.D2-.2=D1.2,U31.D2-.1=D1.1,
        U31.D2-.0=D1.0);
U3.12(U3.Q-.12=Q) = FD2SA(BRESET2_-=CD,BWAIT0-=TE,CP-=CP,
        U3.Q-.12=TI,U33.Z-.12=D);
U3.11(U3.Q-.11=Q) = FD2SA(BRESET2_-=CD,BWAIT0-=TE,CP-=CP,
        U3.Q-.11=TI,U33.Z-.11=D);
U3.10(U3.Q-.10=Q) = FD2SA(BRESET2_-=CD,BWAIT0-=TE,CP-=CP,
        U3.Q-.10=TI,U33.Z-.10=D);
U3.9(U3.Q-.9=Q) = FD2SA(BRESET2_-=CD,BWAIT0-=TE,CP-=CP,U3.Q-.9=TI,
        U33.Z-.9=D);
```

```
U3.8(U3.Q-.8=Q) = FD2SA(BRESET2_-=CD,BWAIT0-=TE,CP-=CP,U3.Q-.8=TI,
        U33.Z-.8=D);
U3.7(U3.Q-.7=Q) = FD2SA(BRESET2_-=CD,BWAIT0-=TE,CP-=CP,U3.Q-.7=TI,
        U33.Z-.7=D);
U3.6(U3.Q-.6=Q) = FD2SA(BRESET2_-=CD,BWAIT0-=TE,CP-=CP,U3.Q-.6=TI,
        U33.Z-.6=D);
U3.5(U3.Q-.5=Q) = FD2SA(BRESET2_-=CD,BWAIT0-=TE,CP-=CP,U3.Q-.5=TI,
        U33.Z-.5=D);
U3.4(U3.Q-.4=Q) = FD2SA(BRESET2_-=CD,BWAIT0-=TE,CP-=CP,U3.Q-.4=TI,
        U33.Z-.4=D);
U3.3(U3.Q-.3=Q) = FD2SA(BRESET2_-=CD,BWAIT0-=TE,CP-=CP,U3.Q-.3=TI,
        U33.Z-.3=D);
U3.2(U3.Q-.2=Q) = FD2SA(BRESET2_-=CD,BWAIT0-=TE,CP-=CP,U3.Q-.2=TI,
        U33.Z-.2=D);
U3.1(U3.Q-.1=Q) = FD2SA(BRESET2_-=CD,BWAIT0-=TE,CP-=CP,U3.Q-.1=TI,
        U33.Z-.1=D);
U3.0(U3.Q-.0=Q) = FD2SA(BRESET2_-=CD,BWAIT0-=TE,CP-=CP,U3.Q-.0=TI,
        U33.Z-.0=D);
U28(U28.S-.25=S.25,U28.S-.24=S.24,U28.S-.23=S.23,U28.S-.22=S.22,
        U28.S-.21=S.21,U28.S-.20=S.20,U28.S-.19=S.19,
        U28.S-.18=S.18,U28.S-.17=S.17,U28.S-.16=S.16,
        U28.S-.15=S.15,U28.S-.14=S.14,U28.S-.13=S.13,
        U28.S-.12=S.12,U28.S-.11=S.11,U28.S-.10=S.10,U28.S-.9=S.9,
        U28.S-.8=S.8,U28.S-.7=S.7,U28.S-.6=S.6,U28.S-.5=S.5,
        U28.S-.4=S.4,U28.S-.3=S.3,U28.S-.2=S.2,U28.S-.1=S.1,
        U28.S-.0=S.0) = DMB2120A(U17.TCX-=TCX,U28.TCYN-=TCYN,
        CD2-.11=Y.11,CD2-.10=Y.10,CD2-.9=Y.9,CD2-.8=Y.8,
        CD2-.7=Y.7,CD2-.6=Y.6,CD2-.5=Y.5,CD2-.4=Y.4,CD2-.3=Y.3,
        CD2-.2=Y.2,CD2-.1=Y.1,CD2-.0=Y.0,U3.Q-.12=X.12,
        U3.Q-.11=X.11,U3.Q-.10=X.10,U3.Q-.9=X.9,U3.Q-.8=X.8,
        U3.Q-.7=X.7,U3.Q-.6=X.6,U3.Q-.5=X.5,U3.Q-.4=X.4,
        U3.Q-.3=X.3,U3.Q-.2=X.2,U3.Q-.1=X.1,U3.Q-.0=X.0,
        U28.RND-=RND);
U24.15(U24.Q-.15=Q) = FD2SA(U24.Q-.15=TI,U24.D-.15=D,BRESET3_-=CD,
        BWAIT1-=TE,CP-=CP);
U24.14(U24.Q-.14=Q) = FD2SA(U24.Q-.14=TI,U24.D-.14=D,BRESET3_-=CD,
        BWAIT1-=TE,CP-=CP);
U24.13(U24.Q-.13=Q) = FD2SA(U24.Q-.13=TI,U24.D-.13=D,BRESET3_-=CD,
        BWAIT1-=TE,CP-=CP);
U24.12(U24.Q-.12=Q) = FD2SA(U24.Q-.12=TI,U24.D-.12=D,BRESET3_-=CD,
        BWAIT1-=TE,CP-=CP);
U24.11(U24.Q-.11=Q) = FD2SA(U24.Q-.11=TI,U24.D-.11=D,BRESET3_-=CD,
        BWAIT1-=TE,CP-=CP);
U24.10(U24.Q-.10=Q) = FD2SA(U24.Q-.10=TI,U24.D-.10=D,BRESET3_-=CD,
        BWAIT1-=TE,CP-=CP);
U24.9(U24.Q-.9=Q) = FD2SA(U24.Q-.9=TI,U24.D-.9=D,BRESET3_-=CD,
        BWAIT1-=TE,CP-=CP);
U24.8(U24.Q-.8=Q) = FD2SA(U24.Q-.8=TI,U24.D-.8=D,BRESET3_-=CD,
        BWAIT1-=TE,CP-=CP);
U24.7(U24.Q-.7=Q) = FD2SA(U24.Q-.7=TI,U24.D-.7=D,BRESET3_-=CD,
        BWAIT1-=TE,CP-=CP);
U24.6(U24.Q-.6=Q) = FD2SA(U24.Q-.6=TI,U24.D-.6=D,BRESET3_-=CD,
        BWAIT1-=TE,CP-=CP);
U24.5(U24.Q-.5=Q) = FD2SA(U24.Q-.5=TI,U24.D-.5=D,BRESET3_-=CD,
        BWAIT1-=TE,CP-=CP);
U24.4(U24.Q-.4=Q) = FD2SA(U24.Q-.4=TI,U24.D-.4=D,BRESET3_-=CD,
        BWAIT1-=TE,CP-=CP);
U24.3(U24.Q-.3=Q) = FD2SA(U24.Q-.3=TI,U24.D-.3=D,BRESET3_-=CD,
        BWAIT1-=TE,CP-=CP);
U24.2(U24.Q-.2=Q) = FD2SA(U24.Q-.2=TI,U24.D-.2=D,BRESET3_-=CD,
        BWAIT1-=TE,CP-=CP);
U24.1(U24.Q-.1=Q) = FD2SA(U24.Q-.1=TI,U24.D-.1=D,BRESET3_-=CD,
        BWAIT1-=TE,CP-=CP);
U24.0(U24.Q-.0=Q) = FD2SA(U24.Q-.0=TI,U24.D-.0=D,BRESET3_-=CD,
        BWAIT1-=TE,CP-=CP);
U20(U20.S-.16=S.16,U20.S-.15=S.15,U20.S-.14=S.14,U20.S-.13=S.13,
        U20.S-.12=S.12,U20.S-.11=S.11,U20.S-.10=S.10,U20.S-.9=S.9,
        U20.S-.8=S.8,U20.S-.7=S.7,U20.S-.6=S.6,U20.S-.5=S.5,
        U20.S-.4=S.4,U20.S-.3=S.3,U20.S-.2=S.2,U20.S-.1=S.1,
        U20.S-.0=S.0) = ADD16F1(U15.Q-.15=B.15,U15.Q-.14=B.14,
        U15.Q-.13=B.13,U15.Q-.12=B.12,U15.Q-.11=B.11,
        U15.Q-.10=B.10,U15.Q-.9=B.9,U15.Q-.8=B.8,U15.Q-.7=B.7,
        U15.Q-.6=B.6,U15.Q-.5=B.5,U15.Q-.4=B.4,U15.Q-.3=B.3,
        U15.Q-.2=B.2,U15.Q-.1=B.1,U15.Q-.0=B.0,U24.Q-.15=A.15,
```

```
        U24.Q-.14=A.14,U24.Q-.13=A.13,U24.Q-.12=A.12,
        U24.Q-.11=A.11,U24.Q-.10=A.10,U24.Q-.9=A.9,U24.Q-.8=A.8,
        U24.Q-.7=A.7,U24.Q-.6=A.6,U24.Q-.5=A.5,U24.Q-.4=A.4,
        U24.Q-.3=A.3,U24.Q-.2=A.2,U24.Q-.1=A.1,U24.Q-.0=A.0);
U15.15(U15.Q-.15=Q) = FD2SA(BRESET2_-=CD,U15.D-.15=D,BWAIT1-=TE,
        U15.Q-.15=TI,CP-=CP);
U15.14(U15.Q-.14=Q) = FD2SA(BRESET2_-=CD,U15.D-.14=D,BWAIT1-=TE,
        U15.Q-.14=TI,CP-=CP);
U15.13(U15.Q-.13=Q) = FD2SA(BRESET2_-=CD,U15.D-.13=D,BWAIT1-=TE,
        U15.Q-.13=TI,CP-=CP);
U15.12(U15.Q-.12=Q) = FD2SA(BRESET2_-=CD,U15.D-.12=D,BWAIT1-=TE,
        U15.Q-.12=TI,CP-=CP);
U15.11(U15.Q-.11=Q) = FD2SA(BRESET2_-=CD,U15.D-.11=D,BWAIT1-=TE,
        U15.Q-.11=TI,CP-=CP);
U15.10(U15.Q-.10=Q) = FD2SA(BRESET2_-=CD,U15.D-.10=D,BWAIT1-=TE,
        U15.Q-.10=TI,CP-=CP);
U15.9(U15.Q-.9=Q) = FD2SA(BRESET2_-=CD,U15.D-.9=D,BWAIT1-=TE,
        U15.Q-.9=TI,CP-=CP);
U15.8(U15.Q-.8=Q) = FD2SA(BRESET2_-=CD,U15.D-.8=D,BWAIT1-=TE,
        U15.Q-.8=TI,CP-=CP);
U15.7(U15.Q-.7=Q) = FD2SA(BRESET2_-=CD,U15.D-.7=D,BWAIT1-=TE,
        U15.Q-.7=TI,CP-=CP);
U15.6(U15.Q-.6=Q) = FD2SA(BRESET2_-=CD,U15.D-.6=D,BWAIT1-=TE,
        U15.Q-.6=TI,CP-=CP);
U15.5(U15.Q-.5=Q) = FD2SA(BRESET2_-=CD,U15.D-.5=D,BWAIT1-=TE,
        U15.Q-.5=TI,CP-=CP);
U15.4(U15.Q-.4=Q) = FD2SA(BRESET2_-=CD,U15.D-.4=D,BWAIT1-=TE,
        U15.Q-.4=TI,CP-=CP);
U15.3(U15.Q-.3=Q) = FD2SA(BRESET2_-=CD,U15.D-.3=D,BWAIT1-=TE,
        U15.Q-.3=TI,CP-=CP);
U15.2(U15.Q-.2=Q) = FD2SA(BRESET2_-=CD,U15.D-.2=D,BWAIT1-=TE,
        U15.Q-.2=TI,CP-=CP);
U15.1(U15.Q-.1=Q) = FD2SA(BRESET2_-=CD,U15.D-.1=D,BWAIT1-=TE,
        U15.Q-.1=TI,CP-=CP);
U15.0(U15.Q-.0=Q) = FD2SA(BRESET2_-=CD,U15.D-.0=D,BWAIT1-=TE,
        U15.Q-.0=TI,CP-=CP);
U27.15(U27.Q-.15=Q) = FD2SA(BRESET1_-=CD,U27.Q-.15=TI,BWAIT1-=TE,
        CP-=CP,U27.D-.15=D);
U27.14(U27.Q-.14=Q) = FD2SA(BRESET1_-=CD,U27.Q-.14=TI,BWAIT1-=TE,
        CP-=CP,U27.D-.14=D);
U27.13(U27.Q-.13=Q) = FD2SA(BRESET1_-=CD,U27.Q-.13=TI,BWAIT1-=TE,
        CP-=CP,U27.D-.13=D);
U27.12(U27.Q-.12=Q) = FD2SA(BRESET1_-=CD,U27.Q-.12=TI,BWAIT1-=TE,
        CP-=CP,U27.D-.12=D);
U27.11(U27.Q-.11=Q) = FD2SA(BRESET1_-=CD,U27.Q-.11=TI,BWAIT1-=TE,
        CP-=CP,U27.D-.11=D);
U27.10(U27.Q-.10=Q) = FD2SA(BRESET1_-=CD,U27.Q-.10=TI,BWAIT1-=TE,
        CP-=CP,U27.D-.10=D);
U27.9(U27.Q-.9=Q) = FD2SA(BRESET1_-=CD,U27.Q-.9=TI,BWAIT1-=TE,
        CP-=CP,U27.D-.9=D);
U27.8(U27.Q-.8=Q) = FD2SA(BRESET1_-=CD,U27.Q-.8=TI,BWAIT1-=TE,
        CP-=CP,U27.D-.8=D);
U27.7(U27.Q-.7=Q) = FD2SA(BRESET1_-=CD,U27.Q-.7=TI,BWAIT1-=TE,
        CP-=CP,U27.D-.7=D);
U27.6(U27.Q-.6=Q) = FD2SA(BRESET1_-=CD,U27.Q-.6=TI,BWAIT1-=TE,
        CP-=CP,U27.D-.6=D);
U27.5(U27.Q-.5=Q) = FD2SA(BRESET1_-=CD,U27.Q-.5=TI,BWAIT1-=TE,
        CP-=CP,U27.D-.5=D);
U27.4(U27.Q-.4=Q) = FD2SA(BRESET1_-=CD,U27.Q-.4=TI,BWAIT1-=TE,
        CP-=CP,U27.D-.4=D);
U27.3(U27.Q-.3=Q) = FD2SA(BRESET1_-=CD,U27.Q-.3=TI,BWAIT1-=TE,
        CP-=CP,U27.D-.3=D);
U27.2(U27.Q-.2=Q) = FD2SA(BRESET1_-=CD,U27.Q-.2=TI,BWAIT1-=TE,
        CP-=CP,U27.D-.2=D);
U27.1(U27.Q-.1=Q) = FD2SA(BRESET1_-=CD,U27.Q-.1=TI,BWAIT1-=TE,
        CP-=CP,U27.D-.1=D);
U27.0(U27.Q-.0=Q) = FD2SA(BRESET1_-=CD,U27.Q-.0=TI,BWAIT1-=TE,
        CP-=CP,U27.D-.0=D);
U6(BRESET0_-=Z) = B3A(RESET_-=A);
U7(BRESET1_-=Z) = B3A(BRESET0_-=A);
U8(BRESET2_-=Z) = B3A(BRESET1_-=A);
U12.15(U12.Q-.15=Q) = FD2SA(CP-=CP,BWAIT2-=TE,BRESET1_-=CD,
        U13.Q-.15=D,U12.Q-.15=TI);
U12.14(U12.Q-.14=Q) = FD2SA(CP-=CP,BWAIT2-=TE,BRESET1_-=CD,
```

```
        U13.Q-.14=D,U12.Q-.14=TI);
U12.13(U12.Q-.13=Q) = FD2SA(CP-=CP,BWAIT2-=TE,BRESET1_-=CD,
        U13.Q-.13=D,U12.Q-.13=TI);
U12.12(U12.Q-.12=Q) = FD2SA(CP-=CP,BWAIT2-=TE,BRESET1_-=CD,
        U13.Q-.12=D,U12.Q-.12=TI);
U12.11(U12.Q-.11=Q) = FD2SA(CP-=CP,BWAIT2-=TE,BRESET1_-=CD,
        U13.Q-.11=D,U12.Q-.11=TI);
U12.10(U12.Q-.10=Q) = FD2SA(CP-=CP,BWAIT2-=TE,BRESET1_-=CD,
        U13.Q-.10=D,U12.Q-.10=TI);
U12.9(U12.Q-.9=Q) = FD2SA(CP-=CP,BWAIT2-=TE,BRESET1_-=CD,
        U13.Q-.9=D,U12.Q-.9=TI);
U12.8(U12.Q-.8=Q) = FD2SA(CP-=CP,BWAIT2-=TE,BRESET1_-=CD,
        U13.Q-.8=D,U12.Q-.8=TI);
U12.7(U12.Q-.7=Q) = FD2SA(CP-=CP,BWAIT2-=TE,BRESET1_-=CD,
        U13.Q-.7=D,U12.Q-.7=TI);
U12.6(U12.Q-.6=Q) = FD2SA(CP-=CP,BWAIT2-=TE,BRESET1_-=CD,
        U13.Q-.6=D,U12.Q-.6=TI);
U12.5(U12.Q-.5=Q) = FD2SA(CP-=CP,BWAIT2-=TE,BRESET1_-=CD,
        U13.Q-.5=D,U12.Q-.5=TI);
U12.4(U12.Q-.4=Q) = FD2SA(CP-=CP,BWAIT2-=TE,BRESET1_-=CD,
        U13.Q-.4=D,U12.Q-.4=TI);
U12.3(U12.Q-.3=Q) = FD2SA(CP-=CP,BWAIT2-=TE,BRESET1_-=CD,
        U13.Q-.3=D,U12.Q-.3=TI);
U12.2(U12.Q-.2=Q) = FD2SA(CP-=CP,BWAIT2-=TE,BRESET1_-=CD,
        U13.Q-.2=D,U12.Q-.2=TI);
U12.1(U12.Q-.1=Q) = FD2SA(CP-=CP,BWAIT2-=TE,BRESET1_-=CD,
        U13.Q-.1=D,U12.Q-.1=TI);
U12.0(U12.Q-.0=Q) = FD2SA(CP-=CP,BWAIT2-=TE,BRESET1_-=CD,
        U13.Q-.0=D,U12.Q-.0=TI);
U38.15(PDO2-.15=Z) = MUX41C(SEL11-=B,SEL10-=A,U38.D1-.15=D1,
        U38.D0-.15=D0,U38.D2-.15=D2,U38.D3-.15=D3);
U38.14(PDO2-.14=Z) = MUX41C(SEL11-=B,SEL10-=A,U38.D1-.14=D1,
        U38.D0-.14=D0,U38.D2-.14=D2,U38.D3-.14=D3);
U38.13(PDO2-.13=Z) = MUX41C(SEL11-=B,SEL10-=A,U38.D1-.13=D1,
        U38.D0-.13=D0,U38.D2-.13=D2,U38.D3-.13=D3);
U38.12(PDO2-.12=Z) = MUX41C(SEL11-=B,SEL10-=A,U38.D1-.12=D1,
        U38.D0-.12=D0,U38.D2-.12=D2,U38.D3-.12=D3);
U38.11(PDO2-.11=Z) = MUX41C(SEL11-=B,SEL10-=A,U38.D1-.11=D1,
        U38.D0-.11=D0,U38.D2-.11=D2,U38.D3-.11=D3);
U38.10(PDO2-.10=Z) = MUX41C(SEL11-=B,SEL10-=A,U38.D1-.10=D1,
        U38.D0-.10=D0,U38.D2-.10=D2,U38.D3-.10=D3);
U38.9(PDO2-.9=Z) = MUX41C(SEL11-=B,SEL10-=A,U38.D1-.9=D1,
        U38.D0-.9=D0,U38.D2-.9=D2,U38.D3-.9=D3);
U38.8(PDO2-.8=Z) = MUX41C(SEL11-=B,SEL10-=A,U38.D1-.8=D1,
        U38.D0-.8=D0,U38.D2-.8=D2,U38.D3-.8=D3);
U38.7(PDO2-.7=Z) = MUX41C(SEL11-=B,SEL10-=A,U38.D1-.7=D1,
        U38.D0-.7=D0,U38.D2-.7=D2,U38.D3-.7=D3);
U38.6(PDO2-.6=Z) = MUX41C(SEL11-=B,SEL10-=A,U38.D1-.6=D1,
        U38.D0-.6=D0,U38.D2-.6=D2,U38.D3-.6=D3);
U38.5(PDO2-.5=Z) = MUX41C(SEL11-=B,SEL10-=A,U38.D1-.5=D1,
        U38.D0-.5=D0,U38.D2-.5=D2,U38.D3-.5=D3);
U38.4(PDO2-.4=Z) = MUX41C(SEL11-=B,SEL10-=A,U38.D1-.4=D1,
        U38.D0-.4=D0,U38.D2-.4=D2,U38.D3-.4=D3);
U38.3(PDO2-.3=Z) = MUX41C(SEL11-=B,SEL10-=A,U38.D1-.3=D1,
        U38.D0-.3=D0,U38.D2-.3=D2,U38.D3-.3=D3);
U38.2(PDO2-.2=Z) = MUX41C(SEL11-=B,SEL10-=A,U38.D1-.2=D1,
        U38.D0-.2=D0,U38.D2-.2=D2,U38.D3-.2=D3);
U38.1(PDO2-.1=Z) = MUX41C(SEL11-=B,SEL10-=A,U38.D1-.1=D1,
        U38.D0-.1=D0,U38.D2-.1=D2,U38.D3-.1=D3);
U38.0(PDO2-.0=Z) = MUX41C(SEL11-=B,SEL10-=A,U38.D1-.0=D1,
        U38.D0-.0=D0,U38.D2-.0=D2,U38.D3-.0=D3);
U23.16(U23.Q-.16=Q) = FD2SA(BWAIT2-=TE,CP-=CP,BRESET2_-=CD,
        U26.S-.16=D,U23.Q-.16=TI);
U23.15(U23.Q-.15=Q) = FD2SA(BWAIT2-=TE,CP-=CP,BRESET2_-=CD,
        U26.S-.15=D,U23.Q-.15=TI);
U23.14(U23.Q-.14=Q) = FD2SA(BWAIT2-=TE,CP-=CP,BRESET2_-=CD,
        U26.S-.14=D,U23.Q-.14=TI);
U23.13(U23.Q-.13=Q) = FD2SA(BWAIT2-=TE,CP-=CP,BRESET2_-=CD,
        U26.S-.13=D,U23.Q-.13=TI);
U23.12(U23.Q-.12=Q) = FD2SA(BWAIT2-=TE,CP-=CP,BRESET2_-=CD,
        U26.S-.12=D,U23.Q-.12=TI);
U23.11(U23.Q-.11=Q) = FD2SA(BWAIT2-=TE,CP-=CP,BRESET2_-=CD,
        U26.S-.11=D,U23.Q-.11=TI);
```

```
U23.10(U23.Q-.10=Q) = FD2SA(BWAIT2-=TE,CP-=CP,BRESET2_-=CD,
        U26.S-.10=D,U23.Q-.10=TI);
U23.9(U23.Q-.9=Q) = FD2SA(BWAIT2-=TE,CP-=CP,BRESET2_-=CD,
        U26.S-.9=D,U23.Q-.9=TI);
U23.8(U23.Q-.8=Q) = FD2SA(BWAIT2-=TE,CP-=CP,BRESET2_-=CD,
        U26.S-.8=D,U23.Q-.8=TI);
U23.7(U23.Q-.7=Q) = FD2SA(BWAIT2-=TE,CP-=CP,BRESET2_-=CD,
        U26.S-.7=D,U23.Q-.7=TI);
U23.6(U23.Q-.6=Q) = FD2SA(BWAIT2-=TE,CP-=CP,BRESET2_-=CD,
        U26.S-.6=D,U23.Q-.6=TI);
U23.5(U23.Q-.5=Q) = FD2SA(BWAIT2-=TE,CP-=CP,BRESET2_-=CD,
        U26.S-.5=D,U23.Q-.5=TI);
U23.4(U23.Q-.4=Q) = FD2SA(BWAIT2-=TE,CP-=CP,BRESET2_-=CD,
        U26.S-.4=D,U23.Q-.4=TI);
U23.3(U23.Q-.3=Q) = FD2SA(BWAIT2-=TE,CP-=CP,BRESET2_-=CD,
        U26.S-.3=D,U23.Q-.3=TI);
U23.2(U23.Q-.2=Q) = FD2SA(BWAIT2-=TE,CP-=CP,BRESET2_-=CD,
        U26.S-.2=D,U23.Q-.2=TI);
U23.1(U23.Q-.1=Q) = FD2SA(BWAIT2-=TE,CP-=CP,BRESET2_-=CD,
        U26.S-.1=D,U23.Q-.1=TI);
U23.0(U23.Q-.0=Q) = FD2SA(BWAIT2-=TE,CP-=CP,BRESET2_-=CD,
        U26.S-.0=D,U23.Q-.0=TI);
U11(BRESET3_-=Z) = B3A(BRESET2_-=A);
U0.12(U0.QD-.12=QD,CNVL-.12=Q0) = SRDLY(NOS-.1=NOS.1,NOS-.0=NOS.0,
        DLY_POL-=DLY_POL,CP-=CP,BWAIT3-=WAIT,U0.D-.12=D,
        BRESET3_-=RESET_);
U0.11(U0.QD-.11=QD,CNVL-.11=Q0) = SRDLY(NOS-.1=NOS.1,NOS-.0=NOS.0,
        DLY_POL-=DLY_POL,CP-=CP,BWAIT3-=WAIT,U0.D-.11=D,
        BRESET3_-=RESET_);
U0.10(U0.QD-.10=QD,CNVL-.10=Q0) = SRDLY(NOS-.1=NOS.1,NOS-.0=NOS.0,
        DLY_POL-=DLY_POL,CP-=CP,BWAIT3-=WAIT,U0.D-.10=D,
        BRESET3_-=RESET_);
U0.9(U0.QD-.9=QD,CNVL-.9=Q0) = SRDLY(NOS-.1=NOS.1,NOS-.0=NOS.0,
        DLY_POL-=DLY_POL,CP-=CP,BWAIT3-=WAIT,U0.D-.9=D,
        BRESET3_-=RESET_);
U0.8(U0.QD-.8=QD,CNVL-.8=Q0) = SRDLY(NOS-.1=NOS.1,NOS-.0=NOS.0,
        DLY_POL-=DLY_POL,CP-=CP,BWAIT3-=WAIT,U0.D-.8=D,
        BRESET3_-=RESET_);
U0.7(U0.QD-.7=QD,CNVL-.7=Q0) = SRDLY(NOS-.1=NOS.1,NOS-.0=NOS.0,
        DLY_POL-=DLY_POL,CP-=CP,BWAIT3-=WAIT,U0.D-.7=D,
        BRESET3_-=RESET_);
U0.6(U0.QD-.6=QD,CNVL-.6=Q0) = SRDLY(NOS-.1=NOS.1,NOS-.0=NOS.0,
        DLY_POL-=DLY_POL,CP-=CP,BWAIT3-=WAIT,U0.D-.6=D,
        BRESET3_-=RESET_);
U0.5(U0.QD-.5=QD,CNVL-.5=Q0) = SRDLY(NOS-.1=NOS.1,NOS-.0=NOS.0,
        DLY_POL-=DLY_POL,CP-=CP,BWAIT3-=WAIT,U0.D-.5=D,
        BRESET3_-=RESET_);
U0.4(U0.QD-.4=QD,CNVL-.4=Q0) = SRDLY(NOS-.1=NOS.1,NOS-.0=NOS.0,
        DLY_POL-=DLY_POL,CP-=CP,BWAIT3-=WAIT,U0.D-.4=D,
        BRESET3_-=RESET_);
U0.3(U0.QD-.3=QD,CNVL-.3=Q0) = SRDLY(NOS-.1=NOS.1,NOS-.0=NOS.0,
        DLY_POL-=DLY_POL,CP-=CP,BWAIT3-=WAIT,U0.D-.3=D,
        BRESET3_-=RESET_);
U0.2(U0.QD-.2=QD,CNVL-.2=Q0) = SRDLY(NOS-.1=NOS.1,NOS-.0=NOS.0,
        DLY_POL-=DLY_POL,CP-=CP,BWAIT3-=WAIT,U0.D-.2=D,
        BRESET3_-=RESET_);
U0.1(U0.QD-.1=QD,CNVL-.1=Q0) = SRDLY(NOS-.1=NOS.1,NOS-.0=NOS.0,
        DLY_POL-=DLY_POL,CP-=CP,BWAIT3-=WAIT,U0.D-.1=D,
        BRESET3_-=RESET_);
U0.0(U0.QD-.0=QD,CNVL-.0=Q0) = SRDLY(NOS-.1=NOS.1,NOS-.0=NOS.0,
        DLY_POL-=DLY_POL,CP-=CP,BWAIT3-=WAIT,U0.D-.0=D,
        BRESET3_-=RESET_);
U14.15(U14.Q-.15=Q) = FD2SA(U14.Q-.15=TI,BRESET1_-=CD,U14.D-.15=D,
        BWAIT3-=TE,CP-=CP);
U14.14(U14.Q-.14=Q) = FD2SA(U14.Q-.14=TI,BRESET1_-=CD,U14.D-.14=D,
        BWAIT3-=TE,CP-=CP);
U14.13(U14.Q-.13=Q) = FD2SA(U14.Q-.13=TI,BRESET1_-=CD,U14.D-.13=D,
        BWAIT3-=TE,CP-=CP);
U14.12(U14.Q-.12=Q) = FD2SA(U14.Q-.12=TI,BRESET1_-=CD,U14.D-.12=D,
        BWAIT3-=TE,CP-=CP);
U14.11(U14.Q-.11=Q) = FD2SA(U14.Q-.11=TI,BRESET1_-=CD,U14.D-.11=D,
        BWAIT3-=TE,CP-=CP);
U14.10(U14.Q-.10=Q) = FD2SA(U14.Q-.10=TI,BRESET1_-=CD,U14.D-.10=D,
        BWAIT3-=TE,CP-=CP);
```

```
U14.9(U14.Q-.9=Q) = FD2SA(U14.Q-.9=TI,BRESET1_-=CD,U14.D-.9=D,
        BWAIT3-=TE,CP-=CP);
U14.8(U14.Q-.8=Q) = FD2SA(U14.Q-.8=TI,BRESET1_-=CD,U14.D-.8=D,
        BWAIT3-=TE,CP-=CP);
U14.7(U14.Q-.7=Q) = FD2SA(U14.Q-.7=TI,BRESET1_-=CD,U14.D-.7=D,
        BWAIT3-=TE,CP-=CP);
U14.6(U14.Q-.6=Q) = FD2SA(U14.Q-.6=TI,BRESET1_-=CD,U14.D-.6=D,
        BWAIT3-=TE,CP-=CP);
U14.5(U14.Q-.5=Q) = FD2SA(U14.Q-.5=TI,BRESET1_-=CD,U14.D-.5=D,
        BWAIT3-=TE,CP-=CP);
U14.4(U14.Q-.4=Q) = FD2SA(U14.Q-.4=TI,BRESET1_-=CD,U14.D-.4=D,
        BWAIT3-=TE,CP-=CP);
U14.3(U14.Q-.3=Q) = FD2SA(U14.Q-.3=TI,BRESET1_-=CD,U14.D-.3=D,
        BWAIT3-=TE,CP-=CP);
U14.2(U14.Q-.2=Q) = FD2SA(U14.Q-.2=TI,BRESET1_-=CD,U14.D-.2=D,
        BWAIT3-=TE,CP-=CP);
U14.1(U14.Q-.1=Q) = FD2SA(U14.Q-.1=TI,BRESET1_-=CD,U14.D-.1=D,
        BWAIT3-=TE,CP-=CP);
U14.0(U14.Q-.0=Q) = FD2SA(U14.Q-.0=TI,BRESET1_-=CD,U14.D-.0=D,
        BWAIT3-=TE,CP-=CP);
U13.15(U13.Q-.15=Q) = FD2SA(U13.Q-.15=TI,CP-=CP,BRESET0_-=CD,
        BWAIT4-=TE,U14.Q-.15=D);
U13.14(U13.Q-.14=Q) = FD2SA(U13.Q-.14=TI,CP-=CP,BRESET0_-=CD,
        BWAIT4-=TE,U14.Q-.14=D);
U13.13(U13.Q-.13=Q) = FD2SA(U13.Q-.13=TI,CP-=CP,BRESET0_-=CD,
        BWAIT4-=TE,U14.Q-.13=D);
U13.12(U13.Q-.12=Q) = FD2SA(U13.Q-.12=TI,CP-=CP,BRESET0_-=CD,
        BWAIT4-=TE,U14.Q-.12=D);
U13.11(U13.Q-.11=Q) = FD2SA(U13.Q-.11=TI,CP-=CP,BRESET0_-=CD,
        BWAIT4-=TE,U14.Q-.11=D);
U13.10(U13.Q-.10=Q) = FD2SA(U13.Q-.10=TI,CP-=CP,BRESET0_-=CD,
        BWAIT4-=TE,U14.Q-.10=D);
U13.9(U13.Q-.9=Q) = FD2SA(U13.Q-.9=TI,CP-=CP,BRESET0_-=CD,
        BWAIT4-=TE,U14.Q-.9=D);
U13.8(U13.Q-.8=Q) = FD2SA(U13.Q-.8=TI,CP-=CP,BRESET0_-=CD,
        BWAIT4-=TE,U14.Q-.8=D);
U13.7(U13.Q-.7=Q) = FD2SA(U13.Q-.7=TI,CP-=CP,BRESET0_-=CD,
        BWAIT4-=TE,U14.Q-.7=D);
U13.6(U13.Q-.6=Q) = FD2SA(U13.Q-.6=TI,CP-=CP,BRESET0_-=CD,
        BWAIT4-=TE,U14.Q-.6=D);
U13.5(U13.Q-.5=Q) = FD2SA(U13.Q-.5=TI,CP-=CP,BRESET0_-=CD,
        BWAIT4-=TE,U14.Q-.5=D);
U13.4(U13.Q-.4=Q) = FD2SA(U13.Q-.4=TI,CP-=CP,BRESET0_-=CD,
        BWAIT4-=TE,U14.Q-.4=D);
U13.3(U13.Q-.3=Q) = FD2SA(U13.Q-.3=TI,CP-=CP,BRESET0_-=CD,
        BWAIT4-=TE,U14.Q-.3=D);
U13.2(U13.Q-.2=Q) = FD2SA(U13.Q-.2=TI,CP-=CP,BRESET0_-=CD,
        BWAIT4-=TE,U14.Q-.2=D);
U13.1(U13.Q-.1=Q) = FD2SA(U13.Q-.1=TI,CP-=CP,BRESET0_-=CD,
        BWAIT4-=TE,U14.Q-.1=D);
U13.0(U13.Q-.0=Q) = FD2SA(U13.Q-.0=TI,CP-=CP,BRESET0_-=CD,
        BWAIT4-=TE,U14.Q-.0=D);
U5.12(U5.Q-.12=Q) = FD2SA(CP-=CP,BRESET0_-=CD,U5.Q-.12=TI,
        U37.Z-.12=D,BWAIT4-=TE);
U5.11(U5.Q-.11=Q) = FD2SA(CP-=CP,BRESET0_-=CD,U5.Q-.11=TI,
        U37.Z-.11=D,BWAIT4-=TE);
U5.10(U5.Q-.10=Q) = FD2SA(CP-=CP,BRESET0_-=CD,U5.Q-.10=TI,
        U37.Z-.10=D,BWAIT4-=TE);
U5.9(U5.Q-.9=Q) = FD2SA(CP-=CP,BRESET0_-=CD,U5.Q-.9=TI,U37.Z-.9=D,
        BWAIT4-=TE);
U5.8(U5.Q-.8=Q) = FD2SA(CP-=CP,BRESET0_-=CD,U5.Q-.8=TI,U37.Z-.8=D,
        BWAIT4-=TE);
U5.7(U5.Q-.7=Q) = FD2SA(CP-=CP,BRESET0_-=CD,U5.Q-.7=TI,U37.Z-.7=D,
        BWAIT4-=TE);
U5.6(U5.Q-.6=Q) = FD2SA(CP-=CP,BRESET0_-=CD,U5.Q-.6=TI,U37.Z-.6=D,
        BWAIT4-=TE);
U5.5(U5.Q-.5=Q) = FD2SA(CP-=CP,BRESET0_-=CD,U5.Q-.5=TI,U37.Z-.5=D,
        BWAIT4-=TE);
U5.4(U5.Q-.4=Q) = FD2SA(CP-=CP,BRESET0_-=CD,U5.Q-.4=TI,U37.Z-.4=D,
        BWAIT4-=TE);
U5.3(U5.Q-.3=Q) = FD2SA(CP-=CP,BRESET0_-=CD,U5.Q-.3=TI,U37.Z-.3=D,
        BWAIT4-=TE);
U5.2(U5.Q-.2=Q) = FD2SA(CP-=CP,BRESET0_-=CD,U5.Q-.2=TI,U37.Z-.2=D,
        BWAIT4-=TE);
```

```
U5.1(U5.Q-.1=Q) = FD2SA(CP-=CP,BRESET0_-=CD,U5.Q-.1=TI,U37.Z-.1=D,
        BWAIT4-=TE);
U5.0(U5.Q-.0=Q) = FD2SA(CP-=CP,BRESET0_-=CD,U5.Q-.0=TI,U37.Z-.0=D,
        BWAIT4-=TE);
U16(U16.S-.25=S.25,U16.S-.24=S.24,U16.S-.23=S.23,U16.S-.22=S.22,
        U16.S-.21=S.21,U16.S-.20=S.20,U16.S-.19=S.19,
        U16.S-.18=S.18,U16.S-.17=S.17,U16.S-.16=S.16,
        U16.S-.15=S.15,U16.S-.14=S.14,U16.S-.13=S.13,
        U16.S-.12=S.12,U16.S-.11=S.11,U16.S-.10=S.10,U16.S-.9=S.9,
        U16.S-.8=S.8,U16.S-.7=S.7,U16.S-.6=S.6,U16.S-.5=S.5,
        U16.S-.4=S.4,U16.S-.3=S.3,U16.S-.2=S.2,U16.S-.1=S.1,
        U16.S-.0=S.0) = DMB2120A(U16.TCYN-=TCYN,U17.TCX-=TCX,
        CD4-.11=Y.11,CD4-.10=Y.10,CD4-.9=Y.9,CD4-.8=Y.8,
        CD4-.7=Y.7,CD4-.6=Y.6,CD4-.5=Y.5,CD4-.4=Y.4,CD4-.3=Y.3,
        CD4-.2=Y.2,CD4-.1=Y.1,CD4-.0=Y.0,U5.Q-.12=X.12,
        U5.Q-.11=X.11,U5.Q-.10=X.10,U5.Q-.9=X.9,U5.Q-.8=X.8,
        U5.Q-.7=X.7,U5.Q-.6=X.6,U5.Q-.5=X.5,U5.Q-.4=X.4,
        U5.Q-.3=X.3,U5.Q-.2=X.2,U5.Q-.1=X.1,U5.Q-.0=X.0,
        U16.RND-=RND);
U30(U30.S-.25=S.25,U30.S-.24=S.24,U30.S-.23=S.23,U30.S-.22=S.22,
        U30.S-.21=S.21,U30.S-.20=S.20,U30.S-.19=S.19,
        U30.S-.18=S.18,U30.S-.17=S.17,U30.S-.16=S.16,
        U30.S-.15=S.15,U30.S-.14=S.14,U30.S-.13=S.13,
        U30.S-.12=S.12,U30.S-.11=S.11,U30.S-.10=S.10,U30.S-.9=S.9,
        U30.S-.8=S.8,U30.S-.7=S.7,U30.S-.6=S.6,U30.S-.5=S.5,
        U30.S-.4=S.4,U30.S-.3=S.3,U30.S-.2=S.2,U30.S-.1=S.1,
        U30.S-.0=S.0) = DMB2120A(U30.TCYN-=TCYN,U17.TCX-=TCX,
        CD0-.11=Y.11,CD0-.10=Y.10,CD0-.9=Y.9,CD0-.8=Y.8,
        CD0-.7=Y.7,CD0-.6=Y.6,CD0-.5=Y.5,CD0-.4=Y.4,CD0-.3=Y.3,
        CD0-.2=Y.2,CD0-.1=Y.1,CD0-.0=Y.0,U1.Q-.12=X.12,
        U1.Q-.11=X.11,U1.Q-.10=X.10,U1.Q-.9=X.9,U1.Q-.8=X.8,
        U1.Q-.7=X.7,U1.Q-.6=X.6,U1.Q-.5=X.5,U1.Q-.4=X.4,
        U1.Q-.3=X.3,U1.Q-.2=X.2,U1.Q-.1=X.1,U1.Q-.0=X.0,
        U30.RND-=RND);
U1.12(U1.Q-.12=Q) = FD2SA(BWAIT0-=TE,U35.Z-.12=D,BRESET0_-=CD,
        CP-=CP,U1.Q-.12=TI);
U1.11(U1.Q-.11=Q) = FD2SA(BWAIT0-=TE,U35.Z-.11=D,BRESET0_-=CD,
        CP-=CP,U1.Q-.11=TI);
U1.10(U1.Q-.10=Q) = FD2SA(BWAIT0-=TE,U35.Z-.10=D,BRESET0_-=CD,
        CP-=CP,U1.Q-.10=TI);
U1.9(U1.Q-.9=Q) = FD2SA(BWAIT0-=TE,U35.Z-.9=D,BRESET0_-=CD,CP-=CP,
        U1.Q-.9=TI);
U1.8(U1.Q-.8=Q) = FD2SA(BWAIT0-=TE,U35.Z-.8=D,BRESET0_-=CD,CP-=CP,
        U1.Q-.8=TI);
U1.7(U1.Q-.7=Q) = FD2SA(BWAIT0-=TE,U35.Z-.7=D,BRESET0_-=CD,CP-=CP,
        U1.Q-.7=TI);
U1.6(U1.Q-.6=Q) = FD2SA(BWAIT0-=TE,U35.Z-.6=D,BRESET0_-=CD,CP-=CP,
        U1.Q-.6=TI);
U1.5(U1.Q-.5=Q) = FD2SA(BWAIT0-=TE,U35.Z-.5=D,BRESET0_-=CD,CP-=CP,
        U1.Q-.5=TI);
U1.4(U1.Q-.4=Q) = FD2SA(BWAIT0-=TE,U35.Z-.4=D,BRESET0_-=CD,CP-=CP,
        U1.Q-.4=TI);
U1.3(U1.Q-.3=Q) = FD2SA(BWAIT0-=TE,U35.Z-.3=D,BRESET0_-=CD,CP-=CP,
        U1.Q-.3=TI);
U1.2(U1.Q-.2=Q) = FD2SA(BWAIT0-=TE,U35.Z-.2=D,BRESET0_-=CD,CP-=CP,
        U1.Q-.2=TI);
U1.1(U1.Q-.1=Q) = FD2SA(BWAIT0-=TE,U35.Z-.1=D,BRESET0_-=CD,CP-=CP,
        U1.Q-.1=TI);
U1.0(U1.Q-.0=Q) = FD2SA(BWAIT0-=TE,U35.Z-.0=D,BRESET0_-=CD,CP-=CP,
        U1.Q-.0=TI);
U25.15(U25.Q-.15=Q) = FD2SA(U25.D-.15=D,U25.Q-.15=TI,BWAIT1-=TE,
        BRESET0_-=CD,CP-=CP);
U25.14(U25.Q-.14=Q) = FD2SA(U25.D-.14=D,U25.Q-.14=TI,BWAIT1-=TE,
        BRESET0_-=CD,CP-=CP);
U25.13(U25.Q-.13=Q) = FD2SA(U25.D-.13=D,U25.Q-.13=TI,BWAIT1-=TE,
        BRESET0_-=CD,CP-=CP);
U25.12(U25.Q-.12=Q) = FD2SA(U25.D-.12=D,U25.Q-.12=TI,BWAIT1-=TE,
        BRESET0_-=CD,CP-=CP);
U25.11(U25.Q-.11=Q) = FD2SA(U25.D-.11=D,U25.Q-.11=TI,BWAIT1-=TE,
        BRESET0_-=CD,CP-=CP);
U25.10(U25.Q-.10=Q) = FD2SA(U25.D-.10=D,U25.Q-.10=TI,BWAIT1-=TE,
        BRESET0_-=CD,CP-=CP);
U25.9(U25.Q-.9=Q) = FD2SA(U25.D-.9=D,U25.Q-.9=TI,BWAIT1-=TE,
        BRESET0_-=CD,CP-=CP);
```

```
U25.8(U25.Q-.8=Q) = FD2SA(U25.D-.8=D,U25.Q-.8=TI,BWAIT1-=TE,
        BRESET0_-=CD,CP-=CP);
U25.7(U25.Q-.7=Q) = FD2SA(U25.D-.7=D,U25.Q-.7=TI,BWAIT1-=TE,
        BRESET0_-=CD,CP-=CP);
U25.6(U25.Q-.6=Q) = FD2SA(U25.D-.6=D,U25.Q-.6=TI,BWAIT1-=TE,
        BRESET0_-=CD,CP-=CP);
U25.5(U25.Q-.5=Q) = FD2SA(U25.D-.5=D,U25.Q-.5=TI,BWAIT1-=TE,
        BRESET0_-=CD,CP-=CP);
U25.4(U25.Q-.4=Q) = FD2SA(U25.D-.4=D,U25.Q-.4=TI,BWAIT1-=TE,
        BRESET0_-=CD,CP-=CP);
U25.3(U25.Q-.3=Q) = FD2SA(U25.D-.3=D,U25.Q-.3=TI,BWAIT1-=TE,
        BRESET0_-=CD,CP-=CP);
U25.2(U25.Q-.2=Q) = FD2SA(U25.D-.2=D,U25.Q-.2=TI,BWAIT1-=TE,
        BRESET0_-=CD,CP-=CP);
U25.1(U25.Q-.1=Q) = FD2SA(U25.D-.1=D,U25.Q-.1=TI,BWAIT1-=TE,
        BRESET0_-=CD,CP-=CP);
U25.0(U25.Q-.0=Q) = FD2SA(U25.D-.0=D,U25.Q-.0=TI,BWAIT1-=TE,
        BRESET0_-=CD,CP-=CP);
U19.16(U19.Q-.16=Q) = FD2SA(U19.Q-.16=TI,BWAIT2-=TE,BRESET3_-=CD,
        U20.S-.16=D,CP-=CP);
U19.15(U19.Q-.15=Q) = FD2SA(U19.Q-.15=TI,BWAIT2-=TE,BRESET3_-=CD,
        U20.S-.15=D,CP-=CP);
U19.14(U19.Q-.14=Q) = FD2SA(U19.Q-.14=TI,BWAIT2-=TE,BRESET3_-=CD,
        U20.S-.14=D,CP-=CP);
U19.13(U19.Q-.13=Q) = FD2SA(U19.Q-.13=TI,BWAIT2-=TE,BRESET3_-=CD,
        U20.S-.13=D,CP-=CP);
U19.12(U19.Q-.12=Q) = FD2SA(U19.Q-.12=TI,BWAIT2-=TE,BRESET3_-=CD,
        U20.S-.12=D,CP-=CP);
U19.11(U19.Q-.11=Q) = FD2SA(U19.Q-.11=TI,BWAIT2-=TE,BRESET3_-=CD,
        U20.S-.11=D,CP-=CP);
U19.10(U19.Q-.10=Q) = FD2SA(U19.Q-.10=TI,BWAIT2-=TE,BRESET3_-=CD,
        U20.S-.10=D,CP-=CP);
U19.9(U19.Q-.9=Q) = FD2SA(U19.Q-.9=TI,BWAIT2-=TE,BRESET3_-=CD,
        U20.S-.9=D,CP-=CP);
U19.8(U19.Q-.8=Q) = FD2SA(U19.Q-.8=TI,BWAIT2-=TE,BRESET3_-=CD,
        U20.S-.8=D,CP-=CP);
U19.7(U19.Q-.7=Q) = FD2SA(U19.Q-.7=TI,BWAIT2-=TE,BRESET3_-=CD,
        U20.S-.7=D,CP-=CP);
U19.6(U19.Q-.6=Q) = FD2SA(U19.Q-.6=TI,BWAIT2-=TE,BRESET3_-=CD,
        U20.S-.6=D,CP-=CP);
U19.5(U19.Q-.5=Q) = FD2SA(U19.Q-.5=TI,BWAIT2-=TE,BRESET3_-=CD,
        U20.S-.5=D,CP-=CP);
U19.4(U19.Q-.4=Q) = FD2SA(U19.Q-.4=TI,BWAIT2-=TE,BRESET3_-=CD,
        U20.S-.4=D,CP-=CP);
U19.3(U19.Q-.3=Q) = FD2SA(U19.Q-.3=TI,BWAIT2-=TE,BRESET3_-=CD,
        U20.S-.3=D,CP-=CP);
U19.2(U19.Q-.2=Q) = FD2SA(U19.Q-.2=TI,BWAIT2-=TE,BRESET3_-=CD,
        U20.S-.2=D,CP-=CP);
U19.1(U19.Q-.1=Q) = FD2SA(U19.Q-.1=TI,BWAIT2-=TE,BRESET3_-=CD,
        U20.S-.1=D,CP-=CP);
U19.0(U19.Q-.0=Q) = FD2SA(U19.Q-.0=TI,BWAIT2-=TE,BRESET3_-=CD,
        U20.S-.0=D,CP-=CP);
U22(U22.S-.17=S.17,U22.S-.16=S.16,U22.S-.15=S.15,U22.S-.14=S.14,
        U22.S-.13=S.13,U22.S-.12=S.12,U22.S-.11=S.11,
        U22.S-.10=S.10,U22.S-.9=S.9,U22.S-.8=S.8,U22.S-.7=S.7,
        U22.S-.6=S.6,U22.S-.5=S.5,U22.S-.4=S.4,U22.S-.3=S.3,
        U22.S-.2=S.2,U22.S-.1=S.1,U22.S-.0=S.0) = ADD17F1(
        U23.Q-.16=A.16,U23.Q-.15=A.15,U23.Q-.14=A.14,
        U23.Q-.13=A.13,U23.Q-.12=A.12,U23.Q-.11=A.11,
        U23.Q-.10=A.10,U23.Q-.9=A.9,U23.Q-.8=A.8,U23.Q-.7=A.7,
        U23.Q-.6=A.6,U23.Q-.5=A.5,U23.Q-.4=A.4,U23.Q-.3=A.3,
        U23.Q-.2=A.2,U23.Q-.1=A.1,U23.Q-.0=A.0,U19.Q-.16=B.16,
        U19.Q-.15=B.15,U19.Q-.14=B.14,U19.Q-.13=B.13,
        U19.Q-.12=B.12,U19.Q-.11=B.11,U19.Q-.10=B.10,U19.Q-.9=B.9,
        U19.Q-.8=B.8,U19.Q-.7=B.7,U19.Q-.6=B.6,U19.Q-.5=B.5,
        U19.Q-.4=B.4,U19.Q-.3=B.3,U19.Q-.2=B.2,U19.Q-.1=B.1,
        U19.Q-.0=B.0);
U21.17(U21.Q-.17=Q) = FD2SA(BRESET2_-=CD,CP-=CP,BWAIT2-=TE,
        U21.Q-.17=TI,U22.S-.17=D);
U21.16(U21.Q-.16=Q) = FD2SA(BRESET2_-=CD,CP-=CP,BWAIT2-=TE,
        U21.Q-.16=TI,U22.S-.16=D);
U21.15(U21.Q-.15=Q) = FD2SA(BRESET2_-=CD,CP-=CP,BWAIT2-=TE,
        U21.Q-.15=TI,U22.S-.15=D);
```

```
U21.14(U21.Q-.14=Q) = FD2SA(BRESET2_-=CD,CP-=CP,BWAIT2-=TE,
        U21.Q-.14=TI,U22.S-.14=D);
U21.13(U21.Q-.13=Q) = FD2SA(BRESET2_-=CD,CP-=CP,BWAIT2-=TE,
        U21.Q-.13=TI,U22.S-.13=D);
U21.12(U21.Q-.12=Q) = FD2SA(BRESET2_-=CD,CP-=CP,BWAIT2-=TE,
        U21.Q-.12=TI,U22.S-.12=D);
U21.11(U21.Q-.11=Q) = FD2SA(BRESET2_-=CD,CP-=CP,BWAIT2-=TE,
        U21.Q-.11=TI,U22.S-.11=D);
U21.10(U21.Q-.10=Q) = FD2SA(BRESET2_-=CD,CP-=CP,BWAIT2-=TE,
        U21.Q-.10=TI,U22.S-.10=D);
U21.9(U21.Q-.9=Q) = FD2SA(BRESET2_-=CD,CP-=CP,BWAIT2-=TE,
        U21.Q-.9=TI,U22.S-.9=D);
U21.8(U21.Q-.8=Q) = FD2SA(BRESET2_-=CD,CP-=CP,BWAIT2-=TE,
        U21.Q-.8=TI,U22.S-.8=D);
U21.7(U21.Q-.7=Q) = FD2SA(BRESET2_-=CD,CP-=CP,BWAIT2-=TE,
        U21.Q-.7=TI,U22.S-.7=D);
U21.6(U21.Q-.6=Q) = FD2SA(BRESET2_-=CD,CP-=CP,BWAIT2-=TE,
        U21.Q-.6=TI,U22.S-.6=D);
U21.5(U21.Q-.5=Q) = FD2SA(BRESET2_-=CD,CP-=CP,BWAIT2-=TE,
        U21.Q-.5=TI,U22.S-.5=D);
U21.4(U21.Q-.4=Q) = FD2SA(BRESET2_-=CD,CP-=CP,BWAIT2-=TE,
        U21.Q-.4=TI,U22.S-.4=D);
U21.3(U21.Q-.3=Q) = FD2SA(BRESET2_-=CD,CP-=CP,BWAIT2-=TE,
        U21.Q-.3=TI,U22.S-.3=D);
U21.2(U21.Q-.2=Q) = FD2SA(BRESET2_-=CD,CP-=CP,BWAIT2-=TE,
        U21.Q-.2=TI,U22.S-.2=D);
U21.1(U21.Q-.1=Q) = FD2SA(BRESET2_-=CD,CP-=CP,BWAIT2-=TE,
        U21.Q-.1=TI,U22.S-.1=D);
U21.0(U21.Q-.0=Q) = FD2SA(BRESET2_-=CD,CP-=CP,BWAIT2-=TE,
        U21.Q-.0=TI,U22.S-.0=D);
U4.12(U4.Q-.12=Q) = FD2SA(BRESET3_-=CD,CP-=CP,BWAIT0-=TE,
        U32.Z-.12=D,U4.Q-.12=TI);
U4.11(U4.Q-.11=Q) = FD2SA(BRESET3_-=CD,CP-=CP,BWAIT0-=TE,
        U32.Z-.11=D,U4.Q-.11=TI);
U4.10(U4.Q-.10=Q) = FD2SA(BRESET3_-=CD,CP-=CP,BWAIT0-=TE,
        U32.Z-.10=D,U4.Q-.10=TI);
U4.9(U4.Q-.9=Q) = FD2SA(BRESET3_-=CD,CP-=CP,BWAIT0-=TE,U32.Z-.9=D,
        U4.Q-.9=TI);
U4.8(U4.Q-.8=Q) = FD2SA(BRESET3_-=CD,CP-=CP,BWAIT0-=TE,U32.Z-.8=D,
        U4.Q-.8=TI);
U4.7(U4.Q-.7=Q) = FD2SA(BRESET3_-=CD,CP-=CP,BWAIT0-=TE,U32.Z-.7=D,
        U4.Q-.7=TI);
U4.6(U4.Q-.6=Q) = FD2SA(BRESET3_-=CD,CP-=CP,BWAIT0-=TE,U32.Z-.6=D,
        U4.Q-.6=TI);
U4.5(U4.Q-.5=Q) = FD2SA(BRESET3_-=CD,CP-=CP,BWAIT0-=TE,U32.Z-.5=D,
        U4.Q-.5=TI);
U4.4(U4.Q-.4=Q) = FD2SA(BRESET3_-=CD,CP-=CP,BWAIT0-=TE,U32.Z-.4=D,
        U4.Q-.4=TI);
U4.3(U4.Q-.3=Q) = FD2SA(BRESET3_-=CD,CP-=CP,BWAIT0-=TE,U32.Z-.3=D,
        U4.Q-.3=TI);
U4.2(U4.Q-.2=Q) = FD2SA(BRESET3_-=CD,CP-=CP,BWAIT0-=TE,U32.Z-.2=D,
        U4.Q-.2=TI);
U4.1(U4.Q-.1=Q) = FD2SA(BRESET3_-=CD,CP-=CP,BWAIT0-=TE,U32.Z-.1=D,
        U4.Q-.1=TI);
U4.0(U4.Q-.0=Q) = FD2SA(BRESET3_-=CD,CP-=CP,BWAIT0-=TE,U32.Z-.0=D,
        U4.Q-.0=TI);
U17(U17.S-.25=S.25,U17.S-.24=S.24,U17.S-.23=S.23,U17.S-.22=S.22,
        U17.S-.21=S.21,U17.S-.20=S.20,U17.S-.19=S.19,
        U17.S-.18=S.18,U17.S-.17=S.17,U17.S-.16=S.16,
        U17.S-.15=S.15,U17.S-.14=S.14,U17.S-.13=S.13,
        U17.S-.12=S.12,U17.S-.11=S.11,U17.S-.10=S.10,U17.S-.9=S.9,
        U17.S-.8=S.8,U17.S-.7=S.7,U17.S-.6=S.6,U17.S-.5=S.5,
        U17.S-.4=S.4,U17.S-.3=S.3,U17.S-.2=S.2,U17.S-.1=S.1,
        U17.S-.0=S.0) = DMB2120A(U17.TCX-=TCX,U17.TCYN-=TCYN,
        CD3-.11=Y.11,CD3-.10=Y.10,CD3-.9=Y.9,CD3-.8=Y.8,
        CD3-.7=Y.7,CD3-.6=Y.6,CD3-.5=Y.5,CD3-.4=Y.4,CD3-.3=Y.3,
        CD3-.2=Y.2,CD3-.1=Y.1,CD3-.0=Y.0,U4.Q-.12=X.12,
        U4.Q-.11=X.11,U4.Q-.10=X.10,U4.Q-.9=X.9,U4.Q-.8=X.8,
        U4.Q-.7=X.7,U4.Q-.6=X.6,U4.Q-.5=X.5,U4.Q-.4=X.4,
        U4.Q-.3=X.3,U4.Q-.2=X.2,U4.Q-.1=X.1,U4.Q-.0=X.0,
        U17.RND-=RND);
U29(U29.S-.25=S.25,U29.S-.24=S.24,U29.S-.23=S.23,U29.S-.22=S.22,
        U29.S-.21=S.21,U29.S-.20=S.20,U29.S-.19=S.19,
        U29.S-.18=S.18,U29.S-.17=S.17,U29.S-.16=S.16,
```

```
        U29.S-.15=S.15,U29.S-.14=S.14,U29.S-.13=S.13,
        U29.S-.12=S.12,U29.S-.11=S.11,U29.S-.10=S.10,U29.S-.9=S.9,
        U29.S-.8=S.8,U29.S-.7=S.7,U29.S-.6=S.6,U29.S-.5=S.5,
        U29.S-.4=S.4,U29.S-.3=S.3,U29.S-.2=S.2,U29.S-.1=S.1,
        U29.S-.0=S.0) = DMB2120A(U29.TCYN-=TCYN,U17.TCX-=TCX,
        CD1-.11=Y.11,CD1-.10=Y.10,CD1-.9=Y.9,CD1-.8=Y.8,
        CD1-.7=Y.7,CD1-.6=Y.6,CD1-.5=Y.5,CD1-.4=Y.4,CD1-.3=Y.3,
        CD1-.2=Y.2,CD1-.1=Y.1,CD1-.0=Y.0,U2.Q-.12=X.12,
        U2.Q-.11=X.11,U2.Q-.10=X.10,U2.Q-.9=X.9,U2.Q-.8=X.8,
        U2.Q-.7=X.7,U2.Q-.6=X.6,U2.Q-.5=X.5,U2.Q-.4=X.4,
        U2.Q-.3=X.3,U2.Q-.2=X.2,U2.Q-.1=X.1,U2.Q-.0=X.0,
        U29.RND-=RND);
U2.12(U2.Q-.12=Q) = FD2SA(BRESET1_-=CD,BWAIT0-=TE,CP-=CP,
        U34.Z-.12=D,U2.Q-.12=TI);
U2.11(U2.Q-.11=Q) = FD2SA(BRESET1_-=CD,BWAIT0-=TE,CP-=CP,
        U34.Z-.11=D,U2.Q-.11=TI);
U2.10(U2.Q-.10=Q) = FD2SA(BRESET1_-=CD,BWAIT0-=TE,CP-=CP,
        U34.Z-.10=D,U2.Q-.10=TI);
U2.9(U2.Q-.9=Q) = FD2SA(BRESET1_-=CD,BWAIT0-=TE,CP-=CP,U34.Z-.9=D,
        U2.Q-.9=TI);
U2.8(U2.Q-.8=Q) = FD2SA(BRESET1_-=CD,BWAIT0-=TE,CP-=CP,U34.Z-.8=D,
        U2.Q-.8=TI);
U2.7(U2.Q-.7=Q) = FD2SA(BRESET1_-=CD,BWAIT0-=TE,CP-=CP,U34.Z-.7=D,
        U2.Q-.7=TI);
U2.6(U2.Q-.6=Q) = FD2SA(BRESET1_-=CD,BWAIT0-=TE,CP-=CP,U34.Z-.6=D,
        U2.Q-.6=TI);
U2.5(U2.Q-.5=Q) = FD2SA(BRESET1_-=CD,BWAIT0-=TE,CP-=CP,U34.Z-.5=D,
        U2.Q-.5=TI);
U2.4(U2.Q-.4=Q) = FD2SA(BRESET1_-=CD,BWAIT0-=TE,CP-=CP,U34.Z-.4=D,
        U2.Q-.4=TI);
U2.3(U2.Q-.3=Q) = FD2SA(BRESET1_-=CD,BWAIT0-=TE,CP-=CP,U34.Z-.3=D,
        U2.Q-.3=TI);
U2.2(U2.Q-.2=Q) = FD2SA(BRESET1_-=CD,BWAIT0-=TE,CP-=CP,U34.Z-.2=D,
        U2.Q-.2=TI);
U2.1(U2.Q-.1=Q) = FD2SA(BRESET1_-=CD,BWAIT0-=TE,CP-=CP,U34.Z-.1=D,
        U2.Q-.1=TI);
U2.0(U2.Q- 0=Q) = FD2SA(BRESET1_-=CD,BWAIT0-=TE,CP-=CP,U34.Z-.0=D,
        U2.Q-.0=TI);
U34(U34.Z-.12=Z.12,U34.Z-.11=Z.11,U34.Z-.10=Z.10,U34.Z-.9=Z.9,
        U34.Z-.8=Z.8,U34.Z-.7=Z.7,U34.Z-.6=Z.6,U34.Z-.5=Z.5,
        U34.Z-.4=Z.4,U34.Z-.3=Z.3,U34.Z-.2=Z.2,U34.Z-.1=Z.1,
        U34.Z-.0=Z.0) = MUX2X1W13X8(U36.Q3-.12=D0.12,U36.Q3-.11=D0.11,
        U36.Q3-.10=D0.10,U36.Q3-.9=D0.9,U36.Q3-.8=D0.8,
        U36.Q3-.7=D0.7,U36.Q3-.6=D0.6,U36.Q3-.5=D0.5,
        U36.Q3-.4=D0.4,U36.Q3-.3=D0.3,U36.Q3-.2=D0.2,
        U36.Q3-.1=D0.1,U36.Q3-.0=D0.0,BS-=S,U31.D1-.7=D1.7,
        U31.D1-.6=D1.6,U31.D1-.5=D1.5,U31.D1-.4=D1.4,
        U31.D1-.3=D1.3,U31.D1-.2=D1.2,U31.D1-.1=D1.1,
        U31.D1-.0=D1.0);
U32(U32.Z-.12=Z.12,U32.Z-.11=Z.11,U32.Z-.10=Z.10,U32.Z-.9=Z.9,
        U32.Z-.8=Z.8,U32.Z-.7=Z.7,U32.Z-.6=Z.6,U32.Z-.5=Z.5,
        U32.Z-.4=Z.4,U32.Z-.3=Z.3,U32.Z-.2=Z.2,U32.Z-.1=Z.1,
        U32.Z-.0=Z.0) = MUX2X1W13X8(U36.Q1-.12=D0.12,U36.Q1-.11=D0.11,
        U36.Q1-.10=D0.10,U36.Q1-.9=D0.9,U36.Q1-.8=D0.8,
        U36.Q1-.7=D0.7,U36.Q1-.6=D0.6,U36.Q1-.5=D0.5,
        U36.Q1-.4=D0.4,U36.Q1-.3=D0.3,U36.Q1-.2=D0.2,
        U36.Q1-.1=D0.1,U36.Q1-.0=D0.0,BS-=S,U31.D3-.7=D1.7,
        U31.D3-.6=D1.6,U31.D3-.5=D1.5,U31.D3-.4=D1.4,
        U31.D3-.3=D1.3,U31.D3-.2=D1.2,U31.D3-.1=D1.1,
        U31.D3-.0=D1.0);
U31(U31.D0-.7=D0.7,U31.D0-.6=D0.6,U31.D0-.5=D0.5,U31.D0-.4=D0.4,
        U31.D0-.3=D0.3,U31.D0-.2=D0.2,U31.D0-.1=D0.1,
        U31.D0-.0=D0.0,U31.D1-.7=D1.7,U31.D1-.6=D1.6,
        U31.D1-.5=D1.5,U31.D1-.4=D1.4,U31.D1-.3=D1.3,
        U31.D1-.2=D1.2,U31.D1-.1=D1.1,U31.D1-.0=D1.0,
        U31.D2-.7=D2.7,U31.D2-.6=D2.6,U31.D2-.5=D2.5,
        U31.D2-.4=D2.4,U31.D2-.3=D2.3,U31.D2-.2=D2.2,
        U31.D2-.1=D2.1,U31.D2-.0=D2.0,U31.D4-.7=D4.7,
        U31.D4-.6=D4.6,U31.D4-.5=D4.5,U31.D4-.4=D4.4,
        U31.D4-.3=D4.3,U31.D4-.2=D4.2,U31.D4-.1=D4.1,
        U31.D4-.0=D4.0,U31.D3-.7=D3.7,U31.D3-.6=D3.6,
        U31.D3-.5=D3.5,U31.D3-.4=D3.4,U31.D3-.3=D3.3,
        U31.D3-.2=D3.2,U31.D3-.1=D3.1,U31.D3-.0=D3.0) =
```

```
INP_MUX(BRESET3_-=RESET_,CP-=CP,BWAIT4-=WAIT,LST_ROW-=LAST_ROW,
LST_ROW_1-=LAST_MINUS1,SCND_ROW-=SECOND_ROW,FRST_ROW-=FIRST_ROW,
ROW_ORDR-.2=ROW_ORDR.2,ROW_ORDR-.1=ROW_ORDR.1,
ROW_ORDR-.0=ROW_ORDR.0,STB_I-=STB_I,RC4-.7=RC4.7,
RC4-.6=RC4.6,RC4-.5=RC4.5,RC4-.4=RC4.4,RC4-.3=RC4.3,
RC4-.2=RC4.2,RC4-.1=RC4.1,RC4-.0=RC4.0,RC3-.7=RC3.7,
RC3-.6=RC3.6,RC3-.5=RC3.5,RC3-.4=RC3.4,RC3-.3=RC3.3,
RC3-.2=RC3.2,RC3-.1=RC3.1,RC3-.0=RC3.0,RC2-.7=RC2.7,
RC2-.6=RC2.6,RC2-.5=RC2.5,RC2-.4=RC2.4,RC2-.3=RC2.3,
RC2-.2=RC2.2,RC2-.1=RC2.1,RC2-.0=RC2.0,RC1-.7=RC1.7,
RC1-.6=RC1.6,RC1-.5=RC1.5,RC1-.4=RC1.4,RC1-.3=RC1.3,
RC1-.2=RC1.2,RC1-.1=RC1.1,RC1-.0=RC1.0,RC0-.7=RC0.7,
RC0-.6=RC0.6,RC0-.5=RC0.5,RC0-.4=RC0.4,RC0-.3=RC0.3,
RC0-.2=RC0.2,RC0-.1=RC0.1,RC0-.0=RC0.0,S_MODE-=S_MODE);

/* extractors *****************************/

  U29.S-.24 = (U25.D-.15);
  U29.S-.23 = (U25.D-.14);
  U29.S-.22 = (U25.D-.13);
  U29.S-.21 = (U25.D-.12);
  U29.S-.20 = (U25.D-.11);
  U29.S-.19 = (U25.D-.10);
  U29.S-.18 = (U25.D-.9);
  U29.S-.17 = (U25.D-.8);
  U29.S-.16 = (U25.D-.7);
  U29.S-.15 = (U25.D-.6);
  U29.S-.14 = (U25.D-.5);
  U29.S-.13 = (U25.D-.4);
  U29.S-.12 = (U25.D-.3);
  U29.S-.11 = (U25.D-.2);
  U29.S-.10 = (U25.D-.1);
  U29.S-.9 = (U25.D-.0);
  U10.Z-.4 = (BWAIT4-);
  U16.S-.24 = (U14.D-.15);
  U16.S-.23 = (U14.D-.14);
  U16.S-.22 = (U14.D-.13);
  U16.S-.21 = (U14.D-.12);
  U16.S-.20 = (U14.D-.11);
  U16.S-.19 = (U14.D-.10);
  U16.S-.18 = (U14.D-.9);
  U16.S-.17 = (U14.D-.8);
  U16.S-.16 = (U14.D-.7);
  U16.S-.15 = (U14.D-.6);
  U16.S-.14 = (U14.D-.5);
  U16.S-.13 = (U14.D-.4);
  U16.S-.12 = (U14.D-.3);
  U16.S-.11 = (U14.D-.2);
  U16.S-.10 = (U14.D-.1);
  U16.S-.9 = (U14.D-.0);
  U10.Z-.3 = (BWAIT3-);
  U18.S-.15 = (U0.D-.12);
  U18.S-.14 = (U0.D-.11);
  U18.S-.13 = (U0.D-.10);
  U18.S-.12 = (U0.D-.9);
  U18.S-.11 = (U0.D-.8);
  U18.S-.10 = (U0.D-.7);
  U18.S-.9 = (U0.D-.6);
  U18.S-.8 = (U0.D-.5);
  U18.S-.7 = (U0.D-.4);
  U18.S-.6 = (U0.D-.3);
  U18.S-.5 = (U0.D-.2);
  U18.S-.4 = (U0.D-.1);
  U18.S-.3 = (U0.D-.0);
  U21.Q-.17 = (U38.D2-.15);
  U21.Q-.16 = (U38.D2-.14);
  U21.Q-.15 = (U38.D2-.13);
  U21.Q-.14 = (U38.D2-.12);
  U21.Q-.13 = (U38.D2-.11);
  U21.Q-.12 = (U38.D2-.10);
  U21.Q-.11 = (U38.D2-.9);
  U21.Q-.10 = (U38.D2-.8);
```

```
U21.Q-.9 = (U38.D2-.7);
U21.Q-.8 = (U38.D2-.6);
U21.Q-.7 = (U38.D2-.5);
U21.Q-.6 = (U38.D2-.4);
U21.Q-.5 = (U38.D2-.3);
U21.Q-.4 = (U38.D2-.2);
U21.Q-.3 = (U38.D2-.1);
U21.Q-.2 = (U38.D2-.0);
U17.S-.24 = (U15.D-.15);
U17.S-.23 = (U15.D-.14);
U17.S-.22 = (U15.D-.13);
U17.S-.21 = (U15.D-.12);
U17.S-.20 = (U15.D-.11);
U17.S-.19 = (U15.D-.10);
U17.S-.18 = (U15.D-.9);
U17.S-.17 = (U15.D-.8);
U17.S-.16 = (U15.D-.7);
U17.S-.15 = (U15.D-.6);
U17.S-.14 = (U15.D-.5);
U17.S-.13 = (U15.D-.4);
U17.S-.12 = (U15.D-.3);
U17.S-.11 = (U15.D-.2);
U17.S-.10 = (U15.D-.1);
U17.S-.9 = (U15.D-.0);
U28.S-.24 = (U24.D-.15);
U28.S-.23 = (U24.D-.14);
U28.S-.22 = (U24.D-.13);
U28.S-.21 = (U24.D-.12);
U28.S-.20 = (U24.D-.11);
U28.S-.19 = (U24.D-.10);
U28.S-.18 = (U24.D-.9);
U28.S-.17 = (U24.D-.8);
U28.S-.16 = (U24.D-.7);
U28.S-.15 = (U24.D-.6);
U28.S-.14 = (U24.D-.5);
U28.S-.13 = (U24.D-.4);
U28.S-.12 = (U24.D-.3);
U28.S-.11 = (U24.D-.2);
U28.S-.10 = (U24.D-.1);
U28.S-.9 = (U24.D-.0);
U20.S-.16 = (U38.D0-.15);
U20.S-.15 = (U38.D0-.14);
U20.S-.14 = (U38.D0-.13);
U20.S-.13 = (U38.D0-.12);
U20.S-.12 = (U38.D0-.11);
U20.S-.11 = (U38.D0-.10);
U20.S-.10 = (U38.D0-.9);
U20.S-.9 = (U38.D0-.8);
U20.S-.8 = (U38.D0-.7);
U20.S-.7 = (U38.D0-.6);
U20.S-.6 = (U38.D0-.5);
U20.S-.5 = (U38.D0-.4);
U20.S-.4 = (U38.D0-.3);
U20.S-.3 = (U38.D0-.2);
U20.S-.2 = (U38.D0-.1);
U20.S-.1 = (U38.D0-.0);
U10.Z-.1 = (BWAIT1-);
U30.S-.24 = (U27.D-.15);
U30.S-.23 = (U27.D-.14);
U30.S-.22 = (U27.D-.13);
U30.S-.21 = (U27.D-.12);
U30.S-.20 = (U27.D-.11);
U30.S-.19 = (U27.D-.10);
U30.S-.18 = (U27.D-.9);
U30.S-.17 = (U27.D-.8);
U30.S-.16 = (U27.D-.7);
U30.S-.15 = (U27.D-.6);
U30.S-.14 = (U27.D-.5);
U30.S-.13 = (U27.D-.4);
U30.S-.12 = (U27.D-.3);
U30.S-.11 = (U27.D-.2);
U30.S-.10 = (U27.D-.1);
U30.S-.9 = (U27.D-.0);
```

```
    U18.B-.15 = (U12.Q-.15);
    U18.B-.14 = (U12.Q-.14);
    U18.B-.13 = (U12.Q-.13);
    U18.B-.12 = (U12.Q-.12);
    U18.B-.11 = (U12.Q-.11);
    U18.B-.10 = (U12.Q-.10);
    U18.B-.9 = (U12.Q-.9);
    U18.B-.8 = (U12.Q-.8);
    U18.B-.7 = (U12.Q-.7);
    U18.B-.6 = (U12.Q-.6);
    U18.B-.5 = (U12.Q-.5);
    U18.B-.4 = (U12.Q-.4);
    U18.B-.3 = (U12.Q-.3);
    U18.B-.2 = (U12.Q-.2);
    U18.B-.1 = (U12.Q-.1);
    U18.B-.0 = (U12.Q-.0);
    U18.B-.17 = (M-0);
    U18.B-.16 = (M-0);
    U18.B-.17 = (U38.D3-.15);
    U18.B-.16 = (U38.D3-.14);
    U18.B-.15 = (U38.D3-.13);
    U18.B-.14 = (U38.D3-.12);
    U18.B-.13 = (U38.D3-.11);
    U18.B-.12 = (U38.D3-.10);
    U18.B-.11 = (U38.D3-.9);
    U18.B-.10 = (U38.D3-.8);
    U18.B-.9 = (U38.D3-.7);
    U18.B-.8 = (U38.D3-.6);
    U18.B-.7 = (U38.D3-.5);
    U18.B-.6 = (U38.D3-.4);
    U18.B-.5 = (U38.D3-.3);
    U18.B-.4 = (U38.D3-.2);
    U18.B-.3 = (U38.D3-.1);
    U18.B-.2 = (U38.D3-.0);
    U26.S-.16 = (U38.D1-.15);
    U26.S-.15 = (U38.D1-.14);
    U26.S-.14 = (U38.D1-.13);
    U26.S-.13 = (U38.D1-.12);
    U26.S-.12 = (U38.D1-.11);
    U26.S-.11 = (U38.D1-.10);
    U26.S-.10 = (U38.D1-.9);
    U26.S-.9 = (U38.D1-.8);
    U26.S-.8 = (U38.D1-.7);
    U26.S-.7 = (U38.D1-.6);
    U26.S-.6 = (U38.D1-.5);
    U26.S-.5 = (U38.D1-.4);
    U26.S-.4 = (U38.D1-.3);
    U26.S-.3 = (U38.D1-.2);
    U26.S-.2 = (U38.D1-.1);
    U26.S-.1 = (U38.D1-.0);
    U10.Z-.2 = (BWAIT2-);
    U10.Z-.0 = (BWAIT0-);

  /* type converters *********************/

ANNOTATIONS
{
  BUS BUS_TYPE = "DOT";
}

END MODULE;


/* - * * * * *  Contents of NET file REG23.NET  * * * * * * */

/******************************************************/
/*  Netlist copyright (C) 1989 LSI Logic Corporation  */
/******************************************************/


MODULE REG23;
```

```
INPUTS       CP,DH_CS_,DL_CS_,PDI.15,PDI.14,PDI.13,PDI.12,PDI.11,
             PDI.10,PDI.9,PDI.8,PDI.7,PDI.6,PDI.5,PDI.4,PDI.3,
             PDI.2,PDI.1,PDI.0,RESET_,SCNIN,TEST;
OUTPUTS      Q.22,Q.21,Q.20,Q.19,Q.18,Q.17,Q.16,Q.15,Q.14,Q.13,
             Q.12,Q.11,Q.10,Q.9,Q.8,Q.7,Q.6,Q.5,Q.4,Q.3,Q.2,Q.1,
             Q.0,SCNOUT;

LEVEL FUNCTION;
DEFINE
  /* implicit connectors *******************/

    CP- = (CP);
    RESET_- = (RESET_);
    BRESET_- = (BRESET_);
    TEST- = (TEST);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    SCNIN- = (SCNIN);
    SCNOUT- = (SCNOUT);
    Q-.22 = (Q.22);
    Q-.21 = (Q.21);
    Q-.20 = (Q.20);
    Q-.19 = (Q.19);
    Q-.18 = (Q.18);
    Q-.17 = (Q.17);
    Q-.16 = (Q.16);
    Q-.15 = (Q.15);
    Q-.14 = (Q.14);
    Q-.13 = (Q.13);
    Q-.12 = (Q.12);
    Q-.11 = (Q.11);
    Q-.10 = (Q.10);
    Q-.9 = (Q.9);
    Q-.8 = (Q.8);
    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    BRESET_- = (BRESET_);
    BRESET_- = (BRESET_);
    DH_CS_- = (DH_CS_);
    DL_CS_- = (DL_CS_);

  /* part instances ***************************/

    U6(U6.Z-=Z) = N1A(RESET_-=A);
    U5(BRESET_-=Z) = N1C(U6.Z-=A);
    U0.15(U0.Q-.15=Q) = FD2SA(BRESET_-=CD,TEST-=TE,U2.Z-=CP,PDI-.15=D,
           U0.TI-.15=TI);
    U0.14(U0.Q-.14=Q) = FD2SA(BRESET_-=CD,TEST-=TE,U2.Z-=CP,PDI-.14=D,
           U0.TI-.14=TI);
    U0.13(U0.Q-.13=Q) = FD2SA(BRESET_-=CD,TEST-=TE,U2.Z-=CP,PDI-.13=D,
           U0.TI-.13=TI);
    U0.12(U0.Q-.12=Q) = FD2SA(BRESET_-=CD,TEST-=TE,U2.Z-=CP,PDI-.12=D,
           U0.TI-.12=TI);
```

```
  U0.11(U0.Q-.11=Q) = FD2SA(BRESET_-=CD,TEST-=TE,U2.Z-=CP,PDI-.11=D,
          U0.TI-.11=TI);
  U0.10(U0.Q-.10=Q) = FD2SA(BRESET_-=CD,TEST-=TE,U2.Z-=CP,PDI-.10=D,
          U0.TI-.10=TI);
  U0.9(U0.Q-.9=Q) = FD2SA(BRESET_-=CD,TEST-=TE,U2.Z-=CP,PDI-.9=D,
          U0.TI-.9=TI);
  U0.8(U0.Q-.8=Q) = FD2SA(BRESET_-=CD,TEST-=TE,U2.Z-=CP,PDI-.8=D,
          U0.TI-.8=TI);
  U0.7(U0.Q-.7=Q) = FD2SA(BRESET_-=CD,TEST-=TE,U2.Z-=CP,PDI-.7=D,
          U0.TI-.7=TI);
  U0.6(U0.Q-.6=Q) = FD2SA(BRESET_-=CD,TEST-=TE,U2.Z-=CP,PDI-.6=D,
          U0.TI-.6=TI);
  U0.5(U0.Q-.5=Q) = FD2SA(BRESET_-=CD,TEST-=TE,U2.Z-=CP,PDI-.5=D,
          U0.TI-.5=TI);
  U0.4(U0.Q-.4=Q) = FD2SA(BRESET_-=CD,TEST-=TE,U2.Z-=CP,PDI-.4=D,
          U0.TI-.4=TI);
  U0.3(U0.Q-.3=Q) = FD2SA(BRESET_-=CD,TEST-=TE,U2.Z-=CP,PDI-.3=D,
          U0.TI-.3=TI);
  U0.2(U0.Q-.2=Q) = FD2SA(BRESET_-=CD,TEST-=TE,U2.Z-=CP,PDI-.2=D,
          U0.TI-.2=TI);
  U0.1(U0.Q-.1=Q) = FD2SA(BRESET_-=CD,TEST-=TE,U2.Z-=CP,PDI-.1=D,
          U0.TI-.1=TI);
  U0.0(U0.Q-.0=Q) = FD2SA(BRESET_-=CD,TEST-=TE,U2.Z-=CP,PDI-.0=D,
          U0.TI-.0=TI);
  U1.6(U1.Q-.6=Q) = FD2SA(U1.TI-.6=TI,U1.D-.6=D,U3.Z-=CP,TEST-=TE,
          BRESET_-=CD);
  U1.5(U1.Q-.5=Q) = FD2SA(U1.TI-.5=TI,U1.D-.5=D,U3.Z-=CP,TEST-=TE,
          BRESET_-=CD);
  U1.4(U1.Q-.4=Q) = FD2SA(U1.TI-.4=TI,U1.D-.4=D,U3.Z-=CP,TEST-=TE,
          BRESET_-=CD);
  U1.3(U1.Q-.3=Q) = FD2SA(U1.TI-.3=TI,U1.D-.3=D,U3.Z-=CP,TEST-=TE,
          BRESET_-=CD);
  U1.2(U1.Q-.2=Q) = FD2SA(U1.TI-.2=TI,U1.D-.2=D,U3.Z-=CP,TEST-=TE,
          BRESET_-=CD);
  U1.1(U1.Q-.1=Q) = FD2SA(U1.TI-.1=TI,U1.D-.1=D,U3.Z-=CP,TEST-=TE,
          BRESET_-=CD);
  U1.0(U1.Q-.0=Q) = FD2SA(U1.TI-.0=TI,U1.D-.0=D,U3.Z-=CP,TEST-=TE,
          BRESET_-=CD);
  U3(U3.Z-=Z) = OR2B(CP-=B,DH_CS_-=A);
  U2(U2.Z-=Z) = OR2B(CP-=A,DL_CS_-=B);


/* extractors *****************************/

  PDI-.6 = (U1.D-.6);
  PDI-.5 = (U1.D-.5);
  PDI-.4 = (U1.D-.4);
  PDI-.3 = (U1.D-.3);
  PDI-.2 = (U1.D-.2);
  PDI-.1 = (U1.D-.1);
  PDI-.0 = (U1.D-.0);
  U1.TI-.0 = (SCNIN-);
  U1.TI-.6 = (M-0.5);
  U1.TI-.5 = (M-0.4);
  U1.TI-.4 = (M-0.3);
  U1.TI-.3 = (M-0.2);
  U1.TI-.2 = (M-0.1);
  U1.TI-.1 = (M-0.0);
  U1.Q-.5 = (M-0.5);
  U1.Q-.4 = (M-0.4);
  U1.Q-.3 = (M-0.3);
  U1.Q-.2 = (M-0.2);
  U1.Q-.1 = (M-0.1);
  U1.Q-.0 = (M-0.0);
  U0.Q-.15 = (SCNOUT-);
  U0.TI-.15 = (M-1.14);
  U0.TI-.14 = (M-1.13);
  U0.TI-.13 = (M-1.12);
  U0.TI-.12 = (M-1.11);
  U0.TI-.11 = (M-1.10);
  U0.TI-.10 = (M-1.9);
  U0.TI-.9 = (M-1.8);
  U0.TI-.8 = (M-1.7);
```

```
    U0.TI-.7 = (M-1.6);
    U0.TI-.6 = (M-1.5);
    U0.TI-.5 = (M-1.4);
    U0.TI-.4 = (M-1.3);
    U0.TI-.3 = (M-1.2);
    U0.TI-.2 = (M-1.1);
    U0.TI-.1 = (M-1.0);
    U0.Q-.14 = (M-1.14);
    U0.Q-.13 = (M-1.13);
    U0.Q-.12 = (M-1.12);
    U0.Q-.11 = (M-1.11);
    U0.Q-.10 = (M-1.10);
    U0.Q-.9 = (M-1.9);
    U0.Q-.8 = (M-1.8);
    U0.Q-.7 = (M-1.7);
    U0.Q-.6 = (M-1.6);
    U0.Q-.5 = (M-1.5);
    U0.Q-.4 = (M-1.4);
    U0.Q-.3 = (M-1.3);
    U0.Q-.2 = (M-1.2);
    U0.Q-.1 = (M-1.1);
    U0.Q-.0 = (M-1.0);
    Q-.15 = (U0.Q-.15);
    Q-.14 = (U0.Q-.14);
    Q-.13 = (U0.Q-.13);
    Q-.12 = (U0.Q-.12);
    Q-.11 = (U0.Q-.11);
    Q-.10 = (U0.Q-.10);
    Q-.9 = (U0.Q-.9);
    Q-.8 = (U0.Q-.8);
    Q-.7 = (U0.Q-.7);
    Q-.6 = (U0.Q-.6);
    Q-.5 = (U0.Q-.5);
    Q-.4 = (U0.Q-.4);
    Q-.3 = (U0.Q-.3);
    Q-.2 = (U0.Q-.2);
    Q-.1 = (U0.Q-.1);
    Q-.0 = (U0.Q-.0);
    Q-.22 = (U1.Q-.6);
    Q-.21 = (U1.Q-.5);
    Q-.20 = (U1.Q-.4);
    Q-.19 = (U1.Q-.3);
    Q-.18 = (U1.Q-.2);
    Q-.17 = (U1.Q-.1);
    Q-.16 = (U1.Q-.0);
    U1.Q-.6 = (M-2);
    U0.TI-.0 = (M-2);


  /* type converters *********************/

ANNOTATIONS
{
  BUS BUS_TYPE = "DOT";
}

END MODULE;



/* * * * * * *  Contents of NET file MUX2X1W23.NET  * * * * * * */

/*****************************************************/
/*  Netlist copyright (C) 1989 LSI Logic Corporation  */
/*****************************************************/


MODULE MUX2X1W23;

INPUTS      A.22,A.21,A.20,A.19,A.18,A.17,A.16,A.15,A.14,A.13,
            A.12,A.11,A.10,A.9,A.8,A.7,A.6,A.5,A.4,A.3,A.2,A.1,
            A.0,B.22,B.21,B.20,B.19,B.18,B.17,B.16,B.15,B.14,B.13,
            B.12,B.11,B.10,B.9,B.8,B.7,B.6,B.5,B.4,B.3,B.2,B.1,
            B.0,S;
```

```
OUTPUTS      Z.22,Z.21,Z.20,Z.19,Z.18,Z.17,Z.16,Z.15,Z.14,Z.13,
             Z.12,Z.11,Z.10,Z.9,Z.8,Z.7,Z.6,Z.5,Z.4,Z.3,Z.2,Z.1,
             Z.0;

LEVEL FUNCTION;
DEFINE
  /* implicit connectors *******************/

    A-.22 = (A.22);
    A-.21 = (A.21);
    A-.20 = (A.20);
    A-.19 = (A.19);
    A-.18 = (A.18);
    A-.17 = (A.17);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.22 = (B.22);
    B-.21 = (B.21);
    B-.20 = (B.20);
    B-.19 = (B.19);
    B-.18 = (B.18);
    B-.17 = (B.17);
    B-.16 = (B.16);
    B-.15 = (B.15);
    B-.14 = (B.14);
    B-.13 = (B.13);
    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
    B-.1 = (B.1);
    B-.0 = (B.0);
    S- = (S);
    Z-.22 = (Z.22);
    Z-.21 = (Z.21);
    Z-.20 = (Z.20);
    Z-.19 = (Z.19);
    Z-.18 = (Z.18);
    Z-.17 = (Z.17);
    Z-.16 = (Z.16);
    Z-.15 = (Z.15);
    Z-.14 = (Z.14);
    Z-.13 = (Z.13);
    Z-.12 = (Z.12);
    Z-.11 = (Z.11);
    Z-.10 = (Z.10);
    Z-.9 = (Z.9);
    Z-.8 = (Z.8);
    Z-.7 = (Z.7);
    Z-.6 = (Z.6);
    Z-.5 = (Z.5);
```

```
    Z-.4 = (Z.4);
    Z-.3 = (Z.3);
    Z-.2 = (Z.2);
    Z-.1 = (Z.1);
    Z-.0 = (Z.0);


  /* part instances **************************/

    U2(U2.Z-=Z) = N1D(S-=A);
    U0.22(U0.Z-.22=Z) = MX21LC(A-.22=A,B-.22=B,U2.Z-=S);
    U0.21(U0.Z-.21=Z) = MX21LC(A-.21=A,B-.21=B,U2.Z-=S);
    U0.20(U0.Z-.20=Z) = MX21LC(A-.20=A,B-.20=B,U2.Z-=S);
    U0.19(U0.Z-.19=Z) = MX21LC(A-.19=A,B-.19=B,U2.Z-=S);
    U0.18(U0.Z-.18=Z) = MX21LC(A-.18=A,B-.18=B,U2.Z-=S);
    U0.17(U0.Z-.17=Z) = MX21LC(A-.17=A,B-.17=B,U2.Z-=S);
    U0.16(U0.Z-.16=Z) = MX21LC(A-.16=A,B-.16=B,U2.Z-=S);
    U0.15(U0.Z-.15=Z) = MX21LC(A-.15=A,B-.15=B,U2.Z-=S);
    U0.14(U0.Z-.14=Z) = MX21LC(A-.14=A,B-.14=B,U2.Z-=S);
    U0.13(U0.Z-.13=Z) = MX21LC(A-.13=A,B-.13=B,U2.Z-=S);
    U0.12(U0.Z-.12=Z) = MX21LC(A-.12=A,B-.12=B,U2.Z-=S);
    U0.11(U0.Z-.11=Z) = MX21LC(A-.11=A,B-.11=B,U2.Z-=S);
    U0.10(U0.Z-.10=Z) = MX21LC(A-.10=A,B-.10=B,U2.Z-=S);
    U0.9(U0.Z-.9=Z) = MX21LC(A-.9=A,B-.9=B,U2.Z-=S);
    U0.8(U0.Z-.8=Z) = MX21LC(A-.8=A,B-.8=B,U2.Z-=S);
    U0.7(U0.Z-.7=Z) = MX21LC(A-.7=A,B-.7=B,U2.Z-=S);
    U0.6(U0.Z-.6=Z) = MX21LC(A-.6=A,B-.6=B,U2.Z-=S);
    U0.5(U0.Z-.5=Z) = MX21LC(A-.5=A,B-.5=B,U2.Z-=S);
    U0.4(U0.Z-.4=Z) = MX21LC(A-.4=A,B-.4=B,U2.Z-=S);
    U0.3(U0.Z-.3=Z) = MX21LC(A-.3=A,B-.3=B,U2.Z-=S);
    U0.2(U0.Z-.2=Z) = MX21LC(A-.2=A,B-.2=B,U2.Z-=S);
    U0.1(U0.Z-.1=Z) = MX21LC(A-.1=A,B-.1=B,U2.Z-=S);
    U0.0(U0.Z-.0=Z) = MX21LC(A-.0=A,B-.0=B,U2.Z-=S);
    U1.22(Z-.22=Z) = N1D(U0.Z-.22=A);
    U1.21(Z-.21=Z) = N1D(U0.Z-.21=A);
    U1.20(Z-.20=Z) = N1D(U0.Z-.20=A);
    U1.19(Z-.19=Z) = N1D(U0.Z-.19=A);
    U1.18(Z-.18=Z) = N1D(U0.Z-.18=A);
    U1.17(Z-.17=Z) = N1D(U0.Z-.17=A);
    U1.16(Z-.16=Z) = N1D(U0.Z-.16=A);
    U1.15(Z-.15=Z) = N1D(U0.Z-.15=A);
    U1.14(Z-.14=Z) = N1D(U0.Z-.14=A);
    U1.13(Z-.13=Z) = N1D(U0.Z-.13=A);
    U1.12(Z-.12=Z) = N1D(U0.Z-.12=A);
    U1.11(Z-.11=Z) = N1D(U0.Z-.11=A);
    U1.10(Z-.10=Z) = N1D(U0.Z-.10=A);
    U1.9(Z-.9=Z) = N1D(U0.Z-.9=A);
    U1.8(Z-.8=Z) = N1D(U0.Z-.8=A);
    U1.7(Z-.7=Z) = N1D(U0.Z-.7=A);
    U1.6(Z-.6=Z) = N1D(U0.Z-.6=A);
    U1.5(Z-.5=Z) = N1D(U0.Z-.5=A);
    U1.4(Z-.4=Z) = N1D(U0.Z-.4=A);
    U1.3(Z-.3=Z) = N1D(U0.Z-.3=A);
    U1.2(Z-.2=Z) = N1D(U0.Z-.2=A);
    U1.1(Z-.1=Z) = N1D(U0.Z-.1=A);
    U1.0(Z-.0=Z) = N1D(U0.Z-.0=A);


  /* extractors *****************************/


  /* type converters *********************/

ANNOTATIONS
{
  BUS BUS_TYPE = "DOT";
}

END MODULE;


/* * * * * * *  Contents of NET file ADD23F_SEL3.NET  * * * * * * */
```

```
/*****************************************************/
/*  Netlist copyright (C) 1989 LSI Logic Corporation  */
/*****************************************************/


MODULE ADD23F_SEL3;

INPUTS      A0,A1,A2,B0,B1,B2,CI;
OUTPUTS     SUM0,SUM1,SUM2;

LEVEL FUNCTION;
DEFINE
  /* implicit connectors *******************/

    SUM1- = (SUM1);
    CI- = (CI);
    SUM0- = (SUM0);
    B2- = (B2);
    A2- = (A2);
    B1- = (B1);
    A1- = (A1);
    A0- = (A0);
    B0- = (B0);
    SUM2- = (SUM2);


  /* part instances **************************/

    M___37(M___37.Z-=Z) = N1D(CI-=A);
    M___30(M___30.Z-=Z) = N1C(M___29.Z-=A);
    M___38(SUM0-=Z) = MX21LB(M___29.Z-=B,M___37.Z-=S,M___30.Z-=A);
    M___32(M___32.Z-=Z) = EOB(M___9.Z-=B,M___8.Z-=A);
    M___39(SUM1-=Z) = MX21LB(M___37.Z-=S,M___32.Z-=A,M___31.Z-=B);
    M___31(M___31.Z-=Z) = ENB(M___8.Z-=B,M___1.Z-=A);
    M___6(M___6.Z-=Z) = N1C(M___5.Z-=A);
    M___18(M___18.Z-=Z) = N1B(M___13.Z-=A);
    M___13(M___13.Z-=Z) = NR2C(A2-=A,B2-=B);
    M___12(M___12.Z-=Z) = ND2C(B2-=B,A2-=A);
    M___25(M___25.Z-=Z) = ND2B(M___18.Z-=B,M___12.Z-=A);
    M___26(M___26.Z-=Z) = N1B(M___25.Z-=A);
    M___34(M___34.Z-=Z) = MX21LA(M___11.Z-=S,M___25.Z-=B,M___26.Z-=A);
    M___11(M___11.Z-=Z) = ND2C(M___6.Z-=B,M___3.Z-=A);
    M___4(M___4.Z-=Z) = NR2C(A1-=A,B1-=B);
    M___3(M___3.Z-=Z) = ND2C(B1-=B,A1-=A);
    M___8(M___8.Z-=Z) = ND2B(M___7.Z-=B,M___3.Z-=A);
    M___7(M___7.Z-=Z) = N1B(M___4.Z-=A);
    M___5(M___5.Z-=Z) = NR2C(M___4.Z-=A,M___2.Z-=B);
    M___1(M___1.Z-=Z) = ND2C(B0-=B,A0-=A);
    M___2(M___2.Z-=Z) = NR2C(A0-=A,B0-=B);
    M___9(M___9.Z-=Z) = N1B(M___2.Z-=A);
    M___29(M___29.Z-=Z) = ND2B(M___9.Z-=B,M___1.Z-=A);
    M___10(M___10.Z-=Z) = AO7B(M___3.Z-=C,M___4.Z-=B,M___1.Z-=A);
    M___33(M___33.Z-=Z) = MX21LA(M___25.Z-=B,M___26.Z-=A,M___10.Z-=S);
    M___40(SUM2-=Z) = MX21LB(M___37.Z-=S,M___34.Z-=A,M___33.Z-=B);


  /* extractors ******************************/


  /* type converters *********************/

ANNOTATIONS
{
  BUS BUS_TYPE = "DOT";
}

END MODULE;


/* * * * * * *  Contents of NET file ADD23F0_SEL4.NET  * * * * * * */
```

```
/*****************************************************/
/*  Netlist copyright (C) 1989 LSI Logic Corporation  */
/*****************************************************/


MODULE ADD23F0_SEL4;

INPUTS     A0,A1,A2,A3,B0,B1,B2,B3;
OUTPUTS    G,SUM0,SUM1,SUM2,SUM3;

LEVEL FUNCTION;
DEFINE
  /* implicit connectors *******************/

    B3- = (B3);
    A3- = (A3);
    A1- = (A1);
    B1- = (B1);
    SUM0- = (SUM0);
    A0- = (A0);
    B0- = (B0);
    SUM1- = (SUM1);
    G- = (G);
    SUM2- = (SUM2);
    SUM3- = (SUM3);
    A2- = (A2);
    B2- = (B2);


  /* part instances **************************/

    M___15(M___15.Z-=Z) = NR2C(A3-=A,B3-=B);
    M___14(M___14.Z-=Z) = ND2C(B3-=B,A3-=A);
    M___16(M___16.Z-=Z) = N1B(M___15.Z-=A);
    M___3(M___3.Z-=Z) = ND2C(B1-=B,A1-=A);
    M___4(M___4.Z-=Z) = NR2C(A1-=A,B1-=B);
    M___7(M___7.Z-=Z) = N1B(M___4.Z-=A);
    M___38(SUM0-=Z) = N1C(M___29.Z-=A);
    M___1(M___1.Z-=Z) = ND2C(B0-=B,A0-=A);
    M___2(M___2.Z-=Z) = NR2C(A0-=A,B0-=B);
    M___9(M___9.Z-=Z) = N1B(M___2.Z-=A);
    M___29(M___29.Z-=Z) = ND2B(M___9.Z-=B,M___1.Z-=A);
    M___39(SUM1-=Z) = N1C(M___31.Z-=A);
    M___31(M___31.Z-=Z) = ENB(M___1.Z-=A,M___8.Z-=B);
    M___8(M___8.Z-=Z) = ND2B(M___7.Z-=B,M___3.Z-=A);
    M___10(M___10.Z-=Z) = AO7B(M___1.Z-=A,M___4.Z-=B,M___3.Z-=C);
    M___22(M___22.Z-=Z) = N1C(M___19.Z-=A);
    M___43(G-=Z) = ND2C(M___21.Z-=A,M___22.Z-=B);
    M___21(M___21.Z-=Z) = ND2B(M___10.Z-=B,M___20.Z-=A);
    M___26(M___26.Z-=Z) = N1B(M___25.Z-=A);
    M___40(SUM2-=Z) = N1C(M___33.Z-=A);
    M___33(M___33.Z-=Z) = MX21LA(M___10.Z-=S,M___26.Z-=A,M___25.Z-=B);
    M___18(M___18.Z-=Z) = N1B(M___13.Z-=A);
    M___25(M___25.Z-=Z) = ND2B(M___18.Z-=B,M___12.Z-=A);
    M___27(M___27.Z-=Z) = EOB(M___12.Z-=A,M___17.Z-=B);
    M___41(SUM3-=Z) = N1C(M___35.Z-=A);
    M___35(M___35.Z-=Z) = MX21LA(M___10.Z-=S,M___28.Z-=B,M___27.Z-=A);
    M___28(M___28.Z-=Z) = ENB(M___17.Z-=A,M___18.Z-=B);
    M___17(M___17.Z-=Z) = ND2C(M___16.Z-=B,M___14.Z-=A);
    M___19(M___19.Z-=Z) = AO7A(M___15.Z-=B,M___12.Z-=A,M___14.Z-=C);
    M___20(M___20.Z-=Z) = NR2C(M___15.Z-=B,M___13.Z-=A);
    M___13(M___13.Z-=Z) = NR2C(A2-=A,B2-=B);
    M___12(M___12.Z-=Z) = ND2C(B2-=B,A2-=A);


  /* extractors ******************************/


  /* type converters *********************/

ANNOTATIONS
{
```

```
  BUS BUS_TYPE = "DOT";
}

END MODULE;


/* * * * * * *  Contents of NET file ADD23F.NET  * * * * * * */

/*******************************************************/
/*  Netlist copyright (C) 1989 LSI Logic Corporation  */
/*******************************************************/


MODULE ADD23F;

INPUTS        A.22,A.21,A.20,A.19,A.18,A.17,A.16,A.15,A.14,A.13,
              A.12,A.11,A.10,A.9,A.8,A.7,A.6,A.5,A.4,A.3,A.2,A.1,
              A.0,B.22,B.21,B.20,B.19,B.18,B.17,B.16,B.15,B.14,B.13,
              B.12,B.11,B.10,B.9,B.8,B.7,B.6,B.5,B.4,B.3,B.2,B.1,
              B.0;
OUTPUTS       S.22,S.21,S.20,S.19,S.18,S.17,S.16,S.15,S.14,S.13,
              S.12,S.11,S.10,S.9,S.8,S.7,S.6,S.5,S.4,S.3,S.2,S.1,
              S.0;

LEVEL FUNCTION;
DEFINE
  /* implicit connectors ******************/

    A-.22 = (A.22);
    A-.21 = (A.21);
    A-.20 = (A.20);
    A-.19 = (A.19);
    A-.18 = (A.18);
    A-.17 = (A.17);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.22 = (B.22);
    B-.21 = (B.21);
    B-.20 = (B.20);
    B-.19 = (B.19);
    B-.18 = (B.18);
    B-.17 = (B.17);
    B-.16 = (B.16);
    B-.15 = (B.15);
    B-.14 = (B.14);
    B-.13 = (B.13);
    B-.12 = (B.12);
    B-.11 = (B.11);
    B-.10 = (B.10);
    B-.9 = (B.9);
    B-.8 = (B.8);
    B-.7 = (B.7);
    B-.6 = (B.6);
    B-.5 = (B.5);
    B-.4 = (B.4);
    B-.3 = (B.3);
    B-.2 = (B.2);
```

```
  B-.1 = (B.1);
  B-.0 = (B.0);
  S-.22 = (S.22);
  S-.21 = (S.21);
  S-.20 = (S.20);
  S-.19 = (S.19);
  S-.18 = (S.18);
  S-.17 = (S.17);
  S-.16 = (S.16);
  S-.15 = (S.15);
  S-.14 = (S.14);
  S-.13 = (S.13);
  S-.12 = (S.12);
  S-.11 = (S.11);
  S-.10 = (S.10);
  S-.9 = (S.9);
  S-.8 = (S.8);
  S-.7 = (S.7);
  S-.6 = (S.6);
  S-.5 = (S.5);
  S-.4 = (S.4);
  S-.3 = (S.3);
  S-.2 = (S.2);
  S-.1 = (S.1);
  S-.0 = (S.0);


/* part instances ***************************/

  U1(U1.Z-=Z) = ND2B(U3.Z-=A,U2.Z-=B);
  U2(U2.Z-=Z) = N1A(M___3.G-=A);
  M___24(M___24.Z-=Z) = ND2C(M___4.P-=B,M___3.G-=A);
  M___4(M___4.SUM1-=SUM1,M___4.SUM2-=SUM2,M___4.SUM3-=SUM3,
          M___4.SUM0-=SUM0,M___4.G-=G,M___4.P-=P) = ADD23F_SEL4(
          U1.Z-=CI,M___4.B1-=B1,M___4.B2-=B2,M___4.B3-=B3,
          M___4.B0-=B0,M___4.A0-=A0,M___4.A1-=A1,M___4.A2-=A2,
          M___4.A3-=A3);
  M___25(M___25.Z-=Z) = N1C(M___4.G-=A);
  M___26(M___26.Z-=Z) = ND2C(M___24.Z-=A,M___25.Z-=B);
  M___28(M___28.Z-=Z) = N1B(M___26.Z-=A);
  M___30(M___30.Z-=Z) = ND2B(M___27.Z-=A,M___28.Z-=B);
  M___27(M___27.Z-=Z) = ND2B(M___16.Z-=A,M___23.Z-=B);
  M___1(M___1.G-=G,M___1.SUM3-=SUM3,M___1.SUM2-=SUM2,M___1.SUM1-=SUM1,
          M___1.SUM0-=SUM0) = ADD23F0_SEL4(M___1.A0-=A0,M___1.A1-=A1,
          M___1.A2-=A2,M___1.A3-=A3,M___1.B0-=B0,M___1.B1-=B1,
          M___1.B2-=B2,M___1.B3-=B3);
  M___14(M___14.Z-=Z) = ND2C(M___1.G-=A,M___2.P-=B);
  M___2(M___2.SUM1-=SUM1,M___2.SUM2-=SUM2,M___2.SUM0-=SUM0,
          M___2.G-=G,M___2.P-=P,M___2.SUM3-=SUM3) = ADD23F_SEL4(
          M___1.G-=CI,M___2.B1-=B1,M___2.B2-=B2,M___2.B3-=B3,
          M___2.B0-=B0,M___2.A0-=A0,M___2.A1-=A1,M___2.A2-=A2,
          M___2.A3-=A3);
  M___15(M___15.Z-=Z) = N1C(M___2.G-=A);
  M___16(M___16.Z-=Z) = ND2C(M___14.Z-=A,M___15.Z-=B);
  U3(U3.Z-=Z) = ND2B(M___16.Z-=A,M___3.P-=B);
  M___23(M___23.Z-=Z) = AND2B(M___4.P-=B,M___3.P-=A);
  M___33(M___33.Z-=Z) = ND3B(M___16.Z-=B,M___23.Z-=A,M___5.P-=C);
  M___35(M___35.Z-=Z) = ND2C(M___34.Z-=B,M___33.Z-=A);
  M___34(M___34.Z-=Z) = AO6B(M___5.P-=B,M___5.G-=C,M___26.Z-=A);
  M___5(M___5.SUM1-=SUM1,M___5.SUM2-=SUM2,M___5.SUM3-=SUM3,
          M___5.SUM0-=SUM0,M___5.G-=G,M___5.P-=P) = ADD23F_SEL4(
          M___30.Z-=CI,M___5.B1-=B1,M___5.B2-=B2,M___5.B3-=B3,
          M___5.B0-=B0,M___5.A0-=A0,M___5.A1-=A1,M___5.A2-=A2,
          M___5.A3-=A3);
  M___6(M___6.SUM1-=SUM1,M___6.SUM2-=SUM2,M___6.SUM0-=SUM0) =
          ADD23F_SEL3(M___35.Z-=CI,M___6.B1-=B1,M___6.B2-=B2,
          M___6.B0-=B0,M___6.A0-=A0,M___6.A1-=A1,M___6.A2-=A2);
  M___3(M___3.SUM1-=SUM1,M___3.SUM2-=SUM2,M___3.SUM3-=SUM3,
          M___3.SUM0-=SUM0,M___3.G-=G,M___3.P-=P) = ADD23F_SEL4(
          M___16.Z-=CI,M___3.B3-=B3,M___3.B1-=B1,M___3.B2-=B2,
          M___3.B0-=B0,M___3.A0-=A0,M___3.A1-=A1,M___3.A2-=A2,
          M___3.A3-=A3);
```

```
/* extractors *****************************/

  S-.9 = (M___3.SUM1-);
  S-.10 = (M___3.SUM2-);
  S-.11 = (M___3.SUM3-);
  A-.10 = (M___3.A2-);
  A-.9 = (M___3.A1-);
  A-.8 = (M___3.A0-);
  S-.21 = (M___6.SUM1-);
  S-.22 = (M___6.SUM2-);
  S-.20 = (M___6.SUM0-);
  B-.8 = (M___3.B0-);
  B-.21 = (M___6.B1-);
  B-.10 = (M___3.B2-);
  B-.11 = (M___3.B3-);
  B-.9 = (M___3.B1-);
  B-.22 = (M___6.B2-);
  S-.17 = (M___5.SUM1-);
  S-.18 = (M___5.SUM2-);
  S-.19 = (M___5.SUM3-);
  B-.17 = (M___5.B1-);
  B-.19 = (M___5.B3-);
  S-.16 = (M___5.SUM0-);
  B-.16 = (M___5.B0-);
  S-.13 = (M___4.SUM1-);
  S-.14 = (M___4.SUM2-);
  S-.15 = (M___4.SUM3-);
  B-.13 = (M___4.B1-);
  B-.14 = (M___4.B2-);
  B-.15 = (M___4.B3-);
  S-.12 = (M___4.SUM0-);
  B-.12 = (M___4.B0-);
  A-.12 = (M___4.A0-);
  A-.13 = (M___4.A1-);
  A-.14 = (M___4.A2-);
  A-.15 = (M___4.A3-);
  S-.5 = (M___2.SUM1-);
  S-.6 = (M___2.SUM2-);
  B-.5 = (M___2.B1-);
  B-.6 = (M___2.B2-);
  B-.7 = (M___2.B3-);
  S-.4 = (M___2.SUM0-);
  B-.4 = (M___2.B0-);
  A-.0 = (M___1.A0-);
  A-.1 = (M___1.A1-);
  A-.2 = (M___1.A2-);
  A-.3 = (M___1.A3-);
  B-.0 = (M___1.B0-);
  B-.1 = (M___1.B1-);
  B-.2 = (M___1.B2-);
  B-.3 = (M___1.B3-);
  S-.3 = (M___1.SUM3-);
  S-.2 = (M___1.SUM2-);
  S-.1 = (M___1.SUM1-);
  S-.0 = (M___1.SUM0-);
  A-.4 = (M___2.A0-);
  A-.5 = (M___2.A1-);
  A-.6 = (M___2.A2-);
  A-.7 = (M___2.A3-);
  S-.7 = (M___2.SUM3-);
  A-.16 = (M___5.A0-);
  A-.17 = (M___5.A1-);
  A-.18 = (M___5.A2-);
  A-.19 = (M___5.A3-);
  B-.18 = (M___5.B2-);
  B-.20 = (M___6.B0-);
  A-.21 = (M___6.A1-);
  A-.22 = (M___6.A2-);
  A-.20 = (M___6.A0-);
  A-.11 = (M___3.A3-);
  S-.8 = (M___3.SUM0-);


/* type converters **********************/
```

```
ANNOTATIONS
{
  BUS BUS_TYPE = "DOT";
}

END MODULE;


/* * * * * * *  Contents of NET file ADD23F_SEL4.NET  * * * * * * */

/*******************************************************/
/*  Netlist copyright (C) 1989 LSI Logic Corporation   */
/*******************************************************/


MODULE ADD23F_SEL4;

INPUTS      A0,A1,A2,A3,B0,B1,B2,B3,CI;
OUTPUTS     G,P,SUM0,SUM1,SUM2,SUM3;

LEVEL FUNCTION;
DEFINE
  /* implicit connectors *******************/

    SUM3- = (SUM3);
    SUM2- = (SUM2);
    B2- = (B2);
    A2- = (A2);
    P- = (P);
    B0- = (B0);
    A0- = (A0);
    SUM1- = (SUM1);
    CI- = (CI);
    B1- = (B1);
    A1- = (A1);
    G- = (G);
    A3- = (A3);
    B3- = (B3);
    SUM0- = (SUM0);


  /* part instances **************************/

    M___26(M___26.Z-=Z) = N1B(M___25.Z-=A);
    M___27(M___27.Z-=Z) = EOB(M___12.Z-=A,M___17.Z-=B);
    M___12(M___12.Z-=Z) = ND2C(A2-=A,B2-=B);
    M___13(M___13.Z-=Z) = NR2C(B2-=B,A2-=A);
    M___11(M___11.Z-=Z) = ND2C(M___3.Z-=A,M___6.Z-=B);
    M___6(M___6.Z-=Z) = N1C(M___5.Z-=A);
    M___1(M___1.Z-=Z) = ND2C(A0-=A,B0-=B);
    M___2(M___2.Z-=Z) = NR2C(B0-=B,A0-=A);
    M___37(M___37.Z-=Z) = N1D(CI-=A);
    M___39(SUM1-=Z) = MX21LB(M___37.Z-=S,M___32.Z-=A,M___31.Z-=B);
    M___32(M___32.Z-=Z) = EOB(M___8.Z-=A,M___9.Z-=B);
    M___9(M___9.Z-=Z) = N1B(M___2.Z-=A);
    M___3(M___3.Z-=Z) = ND2C(A1-=A,B1-=B);
    M___4(M___4.Z-=Z) = NR2C(B1-=B,A1-=A);
    M___7(M___7.Z-=Z) = N1B(M___4.Z-=A);
    M___5(M___5.Z-=Z) = NR2C(M___2.Z-=B,M___4.Z-=A);
    M___42(P-=Z) = AND2B(M___20.Z-=B,M___5.Z-=A);
    M___22(M___22.Z-=Z) = N1C(M___19.Z-=A);
    M___43(G-=Z) = ND2C(M___22.Z-=B,M___21.Z-=A);
    M___21(M___21.Z-=Z) = ND2B(M___10.Z-=B,M___20.Z-=A);
    M___20(M___20.Z-=Z) = NR2C(M___13.Z-=A,M___15.Z-=B);
    M___18(M___18.Z-=Z) = N1B(M___13.Z-=A);
    M___28(M___28.Z-=Z) = ENB(M___17.Z-=A,M___18.Z-=B);
    M___17(M___17.Z-=Z) = ND2C(M___14.Z-=A,M___16.Z-=B);
    M___16(M___16.Z-=Z) = N1B(M___15.Z-=A);
    M___15(M___15.Z-=Z) = NR2C(B3-=B,A3-=A);
    M___14(M___14.Z-=Z) = ND2C(A3-=A,B3-=B);
    M___19(M___19.Z-=Z) = AO7A(M___15.Z-=B,M___12.Z-=A,M___14.Z-=C);
    M___25(M___25.Z-=Z) = ND2B(M___18.Z-=B,M___12.Z-=A);
```

```
    M___33(M___33.Z-=Z) = MX21LA(M___10.Z-=S,M___26.Z-=A,M___25.Z-=B);
    M___40(SUM2-=Z) = MX21LB(M___37.Z-=S,M___34.Z-=A,M___33.Z-=B);
    M___34(M___34.Z-=Z) = MX21LA(M___26.Z-=A,M___25.Z-=B,M___11.Z-=S);
    M___36(M___36.Z-=Z) = MX21LA(M___28.Z-=B,M___27.Z-=A,M___11.Z-=S);
    M___41(SUM3-=Z) = MX21LB(M___37.Z-=S,M___35.Z-=B,M___36.Z-=A);
    M___35(M___35.Z-=Z) = MX21LA(M___10.Z-=S,M___28.Z-=B,M___27.Z-=A);
    M___10(M___10.Z-=Z) = AO7B(M___1.Z-=A,M___4.Z-=B,M___3.Z-=C);
    M___8(M___8.Z-=Z) = ND2B(M___7.Z-=B,M___3.Z-=A);
    M___31(M___31.Z-=Z) = ENB(M___1.Z-=A,M___8.Z-=B);
    M___29(M___29.Z-=Z) = ND2B(M___9.Z-=B,M___1.Z-=A);
    M___30(M___30.Z-=Z) = N1C(M___29.Z-=A);
    M___38(SUM0-=Z) = MX21LB(M___29.Z-=B,M___37.Z-=S,M___30.Z-=A);


  /* extractors ******************************/


  /* type converters *********************/

ANNOTATIONS
{
  BUS BUS_TYPE = "DOT";
}

END MODULE;


/* * * * * * *  Contents of NET file XAUV2.NET  * * * * * * */

/*******************************************************/
/*  Netlist copyright (C) 1989 LSI Logic Corporation  */
/*******************************************************/


MODULE XAUV2;

INPUTS      CLRAU,COF_ADRIN.2,COF_ADRIN.1,COF_ADRIN.0,CP,DH_CS_,
            DL_CS_,ENAU,INT_GT_1IN,PDI.15,PDI.14,PDI.13,PDI.12,
            PDI.11,PDI.10,PDI.9,PDI.8,PDI.7,PDI.6,PDI.5,PDI.4,
            PDI.3,PDI.2,PDI.1,PDI.0,PIX_EN,RESET_,SCNIN,SPRCYC,
            S_MODE,TEST,WAIT,WR_;
OUTPUTS     CLRXCNT_,COF_ADR.2,COF_ADR.1,COF_ADR.0,INT_GT_1,
            P1_BUSY;

LEVEL FUNCTION;
DEFINE
  /* implicit connectors *******************/

    P1_BUSY- = (P1_BUSY);
    CLR_- = (CLR_);
    CP- = (CP);
    CP- = (CP);
    CP- = (CP);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    DH_CS_- = (DH_CS_);
    DL_CS_- = (DL_CS_);
```

```
  SCNIN- = (SCNIN);
  TEST- = (TEST);
  WR_- = (WR_);
  RESET_- = (RESET_);
  CLRXCNT_- = (CLRXCNT_);
  CLR_- = (CLR_);
  CLRAU- = (CLRAU);
  BRESET_- = (BRESET_);
  BRESET_- = (BRESET_);
  M-0 = (NC/1/);
  M-1 = (NC/0/);
  S_MODE- = (S_MODE);
  WAIT- = (WAIT);
  INT_GT_1- = (INT_GT_1);
  INT_GT_1IN- = (INT_GT_1IN);
  PIX_EN- = (PIX_EN);
  EN- = (EN);
  EN- = (EN);
  ENAU- = (ENAU);
  SPRCYC- = (SPRCYC);
  EN- = (EN);
  EN- = (EN);
  CLR_- = (CLR_);
  CLR_- = (CLR_);
  COF_ADRIN-.2 = (COF_ADRIN.2);
  COF_ADRIN-.1 = (COF_ADRIN.1);
  COF_ADRIN-.0 = (COF_ADRIN.0);
  COF_ADR-.2 = (COF_ADR.2);
  COF_ADR-.1 = (COF_ADR.1);
  COF_ADR-.0 = (COF_ADR.0);
  S_MODE- = (S_MODE);


/* part instances ****************************/

  U6(CLRXCNT_-=Z) = B3A(CLR_-=A);
  U5(CLR_-=Z) = NR2B(U3.Z1-=A,CLRAU-=B);
  U3(U3.Z1-=Z1,BRESET_-=Z2) = B3IA(RESET_-=A);
  U0(U0.Q-.22=Q.22,U0.Q-.21=Q.21,U0.Q-.20=Q.20,U0.Q-.19=Q.19,
        U0.Q-.18=Q.18,U0.Q-.17=Q.17,U0.Q-.16=Q.16,U0.Q-.15=Q.15,
        U0.Q-.14=Q.14,U0.Q-.13=Q.13,U0.Q-.12=Q.12,U0.Q-.11=Q.11,
        U0.Q-.10=Q.10,U0.Q-.9=Q.9,U0.Q-.8=Q.8,U0.Q-.7=Q.7,
        U0.Q-.6=Q.6,U0.Q-.5=Q.5,U0.Q-.4=Q.4,U0.Q-.3=Q.3,
        U0.Q-.2=Q.2,U0.Q-.1=Q.1,U0.Q-.0=Q.0) = REG23(PDI-.15=PDI.15,
        PDI-.14=PDI.14,PDI-.13=PDI.13,PDI-.12=PDI.12,PDI-.11=PDI.11,
        PDI-.10=PDI.10,PDI-.9=PDI.9,PDI-.8=PDI.8,PDI-.7=PDI.7,
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,DH_CS_-=DH_CS_,
        DL_CS_-=DL_CS_,SCNIN-=SCNIN,TEST-=TEST,WR_-=CP,
        BRESET_-=RESET_);
  U7(U7.Z-.22=Z.22,U7.Z-.21=Z.21,U7.Z-.20=Z.20,U7.Z-.19=Z.19,
        U7.Z-.18=Z.18,U7.Z-.17=Z.17,U7.Z-.16=Z.16,U7.Z-.15=Z.15,
        U7.Z-.14=Z.14,U7.Z-.13=Z.13,U7.Z-.12=Z.12,U7.Z-.11=Z.11,
        U7.Z-.10=Z.10,U7.Z-.9=Z.9,U7.Z-.8=Z.8,U7.Z-.7=Z.7,
        U7.Z-.6=Z.6,U7.Z-.5=Z.5,U7.Z-.4=Z.4,U7.Z-.3=Z.3,
        U7.Z-.2=Z.2,U7.Z-.1=Z.1,U7.Z-.0=Z.0) = MUX2X1W23(
        U14.QN-=S,U0.Q-.22=A.22,U0.Q-.21=A.21,U0.Q-.20=A.20,
        U0.Q-.19=A.19,U0.Q-.18=A.18,U0.Q-.17=A.17,U0.Q-.16=A.16,
        U0.Q-.15=A.15,U0.Q-.14=A.14,U0.Q-.13=A.13,U0.Q-.12=A.12,
        U0.Q-.11=A.11,U0.Q-.10=A.10,U0.Q-.9=A.9,U0.Q-.8=A.8,
        U0.Q-.7=A.7,U0.Q-.6=A.6,U0.Q-.5=A.5,U0.Q-.4=A.4,
        U0.Q-.3=A.3,U0.Q-.2=A.2,U0.Q-.1=A.1,U0.Q-.0=A.0,
        U7.B-.22=B.22,U7.B-.21=B.21,U7.B-.20=B.20,U7.B-.19=B.19,
        U7.B-.18=B.18,U7.B-.17=B.17,U7.B-.16=B.16,U7.B-.15=B.15,
        U7.B-.14=B.14,U7.B-.13=B.13,U7.B-.12=B.12,U7.B-.11=B.11,
        U7.B-.10=B.10,U7.B-.9=B.9,U7.B-.8=B.8,U7.B-.7=B.7,
        U7.B-.6=B.6,U7.B-.5=B.5,U7.B-.4=B.4,U7.B-.3=B.3,
        U7.B-.2=B.2,U7.B-.1=B.1,U7.B-.0=B.0);
  U8(U8.S-.22=S.22,U8.S-.21=S.21,U8.S-.20=S.20,U8.S-.19=S.19,
        U8.S-.18=S.18,U8.S-.17=S.17,U8.S-.16=S.16,U8.S-.15=S.15,
        U8.S-.14=S.14,U8.S-.13=S.13,U8.S-.12=S.12,U8.S-.11=S.11,
        U8.S-.10=S.10,U8.S-.9=S.9,U8.S-.8=S.8,U8.S-.7=S.7,
        U8.S-.6=S.6,U8.S-.5=S.5,U8.S-.4=S.4,U8.S-.3=S.3,
```

```
        U8.S-.2=S.2,U8.S-.1=S.1,U8.S-.0=S.0) = ADD23F(U11.Q-.22=B.22,
        U11.Q-.21=B.21,U11.Q-.20=B.20,U11.Q-.19=B.19,
        U11.Q-.18=B.18,U11.Q-.17=B.17,U11.Q-.16=B.16,
        U11.Q-.15=B.15,U11.Q-.14=B.14,U11.Q-.13=B.13,
        U11.Q-.12=B.12,U11.Q-.11=B.11,U11.Q-.10=B.10,U11.Q-.9=B.9,
        U11.Q-.8=B.8,U11.Q-.7=B.7,U11.Q-.6=B.6,U11.Q-.5=B.5,
        U11.Q-.4=B.4,U11.Q-.3=B.3,U11.Q-.2=B.2,U11.Q-.1=B.1,
        U11.Q-.0=B.0,U7.Z-.22=A.22,U7.Z-.21=A.21,U7.Z-.20=A.20,
        U7.Z-.19=A.19,U7.Z-.18=A.18,U7.Z-.17=A.17,U7.Z-.16=A.16,
        U7.Z-.15=A.15,U7.Z-.14=A.14,U7.Z-.13=A.13,U7.Z-.12=A.12,
        U7.Z-.11=A.11,U7.Z-.10=A.10,U7.Z-.9=A.9,U7.Z-.8=A.8,
        U7.Z-.7=A.7,U7.Z-.6=A.6,U7.Z-.5=A.5,U7.Z-.4=A.4,
        U7.Z-.3=A.3,U7.Z-.2=A.2,U7.Z-.1=A.1,U7.Z-.0=A.0);
U13(U13.Z-=Z) = OR3B(U13.C-=C,U13.B-=B,U13.A-=A);
U16(INT_GT_1-=Z) = NR2C(WAIT-=A,U15.Z-=B);
U18(U18.Z-=Z) = N1C(PIX_EN-=A);
U4(U4.Z-=Z) = AND2C(INT_GT_1IN-=A,U18.Z-=B);
U15(U15.Z-=Z) = MX21LB(U14.Q-=A,S_MODE-=S,U4.Z-=B);
U14(U14.QN-=QN,U14.Q-=Q) = FD2SA(CLR_-=CD,EN-=TE,CP-=CP,U13.Z-=D,
        U14.Q-=TI);
U1(U1.Z-=Z) = N1A(SPRCYC-=A);
U2(EN-=Z) = ND2B(ENAU-=B,U1.Z-=A);
U17(P1_BUSY-=Q) = FD2SA(P1_BUSY-=TI,INT_GT_1-=D,CP-=CP,EN-=TE,
        CLR_-=CD);
U11.22(U11.Q-.22=Q) = FD2SA(U8.S-.22=D,EN-=TE,CP-=CP,U11.Q-.22=TI,
        CLR_-=CD);
U11.21(U11.Q-.21=Q) = FD2SA(U8.S-.21=D,EN-=TE,CP-=CP,U11.Q-.21=TI,
        CLR_-=CD);
U11.20(U11.Q-.20=Q) = FD2SA(U8.S-.20=D,EN-=TE,CP-=CP,U11.Q-.20=TI,
        CLR_-=CD);
U11.19(U11.Q-.19=Q) = FD2SA(U8.S-.19=D,EN-=TE,CP-=CP,U11.Q-.19=TI,
        CLR_-=CD);
U11.18(U11.Q-.18=Q) = FD2SA(U8.S-.18=D,EN-=TE,CP-=CP,U11.Q-.18=TI,
        CLR_-=CD);
U11.17(U11.Q-.17=Q) = FD2SA(U8.S-.17=D,EN-=TE,CP-=CP,U11.Q-.17=TI,
        CLR_-=CD);
U11.16(U11.Q-.16=Q) = FD2SA(U8.S-.16=D,EN-=TE,CP-=CP,U11.Q-.16=TI,
        CLR_-=CD);
U11.15(U11.Q-.15=Q) = FD2SA(U8.S-.15=D,EN-=TE,CP-=CP,U11.Q-.15=TI,
        CLR_-=CD);
U11.14(U11.Q-.14=Q) = FD2SA(U8.S-.14=D,EN-=TE,CP-=CP,U11.Q-.14=TI,
        CLR_-=CD);
U11.13(U11.Q-.13=Q) = FD2SA(U8.S-.13=D,EN-=TE,CP-=CP,U11.Q-.13=TI,
        CLR_-=CD);
U11.12(U11.Q-.12=Q) = FD2SA(U8.S-.12=D,EN-=TE,CP-=CP,U11.Q-.12=TI,
        CLR_-=CD);
U11.11(U11.Q-.11=Q) = FD2SA(U8.S-.11=D,EN-=TE,CP-=CP,U11.Q-.11=TI,
        CLR_-=CD);
U11.10(U11.Q-.10=Q) = FD2SA(U8.S-.10=D,EN-=TE,CP-=CP,U11.Q-.10=TI,
        CLR_-=CD);
U11.9(U11.Q-.9=Q) = FD2SA(U8.S-.9=D,EN-=TE,CP-=CP,U11.Q-.9=TI,
        CLR_-=CD);
U11.8(U11.Q-.8=Q) = FD2SA(U8.S-.8=D,EN-=TE,CP-=CP,U11.Q-.8=TI,
        CLR_-=CD);
U11.7(U11.Q-.7=Q) = FD2SA(U8.S-.7=D,EN-=TE,CP-=CP,U11.Q-.7=TI,
        CLR_-=CD);
U11.6(U11.Q-.6=Q) = FD2SA(U8.S-.6=D,EN-=TE,CP-=CP,U11.Q-.6=TI,
        CLR_-=CD);
U11.5(U11.Q-.5=Q) = FD2SA(U8.S-.5=D,EN-=TE,CP-=CP,U11.Q-.5=TI,
        CLR_-=CD);
U11.4(U11.Q-.4=Q) = FD2SA(U8.S-.4=D,EN-=TE,CP-=CP,U11.Q-.4=TI,
        CLR_-=CD);
U11.3(U11.Q-.3=Q) = FD2SA(U8.S-.3=D,EN-=TE,CP-=CP,U11.Q-.3=TI,
        CLR_-=CD);
U11.2(U11.Q-.2=Q) = FD2SA(U8.S-.2=D,EN-=TE,CP-=CP,U11.Q-.2=TI,
        CLR_-=CD);
U11.1(U11.Q-.1=Q) = FD2SA(U8.S-.1=D,EN-=TE,CP-=CP,U11.Q-.1=TI,
        CLR_-=CD);
U11.0(U11.Q-.0=Q) = FD2SA(U8.S-.0=D,EN-=TE,CP-=CP,U11.Q-.0=TI,
        CLR_-=CD);
U12.2(COF_ADR-.2=Z) = N1B(U10.Z-.2=A);
U12.1(COF_ADR-.1=Z) = N1B(U10.Z-.1=A);
U12.0(COF_ADR-.0=Z) = N1B(U10.Z-.0=A);
```

```
    U10.2(U10.Z-.2=Z) = MX21LB(U10.A-.2=A,COF_ADRIN-.2=B,S_MODE-=S);
    U10.1(U10.Z-.1=Z) = MX21LB(U10.A-.1=A,COF_ADRIN-.1=B,S_MODE-=S);
    U10.0(U10.Z-.0=Z) = MX21LB(U10.A-.0=A,COF_ADRIN-.0=B,S_MODE-=S);


  /* extractors ******************************/

    U7.B-.22 = (M-0);
    U7.B-.21 = (M-0);
    U7.B-.20 = (M-0);
    U7.B-.15 = (M-1);
    U7.B-.0 = (M-1);
    U7.B-.8 = (M-1);
    U7.B-.19 = (M-1);
    U7.B-.11 = (M-1);
    U7.B-.14 = (M-1);
    U7.B-.1 = (M-1);
    U7.B-.16 = (M-1);
    U7.B-.17 = (M-1);
    U7.B-.2 = (M-1);
    U7.B-.9 = (M-1);
    U7.B-.3 = (M-1);
    U7.B-.13 = (M-1);
    U7.B-.18 = (M-1);
    U7.B-.6 = (M-1);
    U7.B-.7 = (M-1);
    U7.B-.12 = (M-1);
    U7.B-.4 = (M-1);
    U7.B-.5 = (M-1);
    U7.B-.10 = (M-1);
    U8.S-.21 = (U13.B-);
    U8.S-.22 = (U13.C-);
    U8.S-.20 = (U13.A-);
    U11.Q-.19 = (U10.A-.2);
    U11.Q-.18 = (U10.A-.1);
    U11.Q-.17 = (U10.A-.0);


  /* type converters *********************/

ANNOTATIONS
{
  BUS BUS_TYPE = "DOT";
}

END MODULE;



/* * * * * * *  Contents of NET file MUX2X1W4.NET  * * * * * * */

/*******************************************************/
/*  Netlist copyright (C) 1989 LSI Logic Corporation   */
/*******************************************************/


MODULE MUX2X1W4;

INPUTS      A.3,A.2,A.1,A.0,B.3,B.2,B.1,B.0,S;
OUTPUTS     Z.3,Z.2,Z.1,Z.0;

LEVEL FUNCTION;
DEFINE
  /* implicit connectors *******************/

    A-.3 = (A.3);
    A-.2 = (A.2);
    A-.1 = (A.1);
    A-.0 = (A.0);
    Z-.3 = (Z.3);
    Z-.2 = (Z.2);
    Z-.1 = (Z.1);
    Z-.0 = (Z.0);
```

```
S- = (S);
B-.3 = (B.3);
B-.2 = (B.2);
B-.1 = (B.1);
B-.0 = (B.0);


/* part instances ***************************/

U0.3(Z-.3=Z) = N1D(U1.Z-.3=A);
U0.2(Z-.2=Z) = N1D(U1.Z-.2=A);
U0.1(Z-.1=Z) = N1D(U1.Z-.1=A);
U0.0(Z-.0=Z) = N1D(U1.Z-.0=A);
U1.3(U1.Z-.3=Z) = MX21LC(A-.3=A,B-.3=B,S-=S);
U1.2(U1.Z-.2=Z) = MX21LC(A-.2=A,B-.2=B,S-=S);
U1.1(U1.Z-.1=Z) = MX21LC(A-.1=A,B-.1=B,S-=S);
U1.0(U1.Z-.0=Z) = MX21LC(A-.0=A,B-.0=B,S-=S);


/* extractors ******************************/


/* type converters *********************/

ANNOTATIONS
{
  BUS BUS_TYPE = "DOT";
}

END MODULE;


/* * * * * * *  Contents of NET file MX5W12.NET  * * * * * * */

/*******************************************************/
/*  Netlist copyright (C) 1989 LSI Logic Corporation  */
/*******************************************************/


MODULE MX5W12;

INPUTS      D0.11,D0.10,D0.9,D0.8,D0.7,D0.6,D0.5,D0.4,D0.3,D0.2,
            D0.1,D0.0,D1.11,D1.10,D1.9,D1.8,D1.7,D1.6,D1.5,D1.4,
            D1.3,D1.2,D1.1,D1.0,D2.11,D2.10,D2.9,D2.8,D2.7,D2.6,
            D2.5,D2.4,D2.3,D2.2,D2.1,D2.0,D3.11,D3.10,D3.9,D3.8,
            D3.7,D3.6,D3.5,D3.4,D3.3,D3.2,D3.1,D3.0,D4.11,D4.10,
            D4.9,D4.8,D4.7,D4.6,D4.5,D4.4,D4.3,D4.2,D4.1,D4.0,S.4,
            S.3,S.2,S.1,S.0;
OUTPUTS     Z.11,Z.10,Z.9,Z.8,Z.7,Z.6,Z.5,Z.4,Z.3,Z.2,Z.1,Z.0;

LEVEL FUNCTION;
DEFINE
  /* implicit connectors *******************/

    D0-.11 = (D0.11);
    D0-.10 = (D0.10);
    D0-.9 = (D0.9);
    D0-.8 = (D0.8);
    D0-.7 = (D0.7);
    D0-.6 = (D0.6);
    D0-.5 = (D0.5);
    D0-.4 = (D0.4);
    D0-.3 = (D0.3);
    D0-.2 = (D0.2);
    D0-.1 = (D0.1);
    D0-.0 = (D0.0);
    D1-.11 = (D1.11);
    D1-.10 = (D1.10);
    D1-.9 = (D1.9);
    D1-.8 = (D1.8);
    D1-.7 = (D1.7);
```

```
D1-.6 = (D1.6);
D1-.5 = (D1.5);
D1-.4 = (D1.4);
D1-.3 = (D1.3);
D1-.2 = (D1.2);
D1-.1 = (D1.1);
D1-.0 = (D1.0);
D2-.11 = (D2.11);
D2-.10 = (D2.10);
D2-.9 = (D2.9);
D2-.8 = (D2.8);
D2-.7 = (D2.7);
D2-.6 = (D2.6);
D2-.5 = (D2.5);
D2-.4 = (D2.4);
D2-.3 = (D2.3);
D2-.2 = (D2.2);
D2-.1 = (D2.1);
D2-.0 = (D2.0);
S-.4 = (S.4);
S-.3 = (S.3);
S-.2 = (S.2);
S-.1 = (S.1);
S-.0 = (S.0);
D3-.11 = (D3.11);
D3-.10 = (D3.10);
D3-.9 = (D3.9);
D3-.8 = (D3.8);
D3-.7 = (D3.7);
D3-.6 = (D3.6);
D3-.5 = (D3.5);
D3-.4 = (D3.4);
D3-.3 = (D3.3);
D3-.2 = (D3.2);
D3-.1 = (D3.1);
D3-.0 = (D3.0);
D4-.11 = (D4.11);
D4-.10 = (D4.10);
D4-.9 = (D4.9);
D4-.8 = (D4.8);
D4-.7 = (D4.7);
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
Z-.11 = (Z.11);
Z-.10 = (Z.10);
Z-.9 = (Z.9);
Z-.8 = (Z.8);
Z-.7 = (Z.7);
Z-.6 = (Z.6);
Z-.5 = (Z.5);
Z-.4 = (Z.4);
Z-.3 = (Z.3);
Z-.2 = (Z.2);
Z-.1 = (Z.1);
Z-.0 = (Z.0);

/* part instances ***************************/

M___36(M___36.Z-=Z) = ND2B(M___36.A-=A,M___7.Z-=B);
M___37(M___37.Z-=Z) = ND2B(M___37.A-=A,M___8.Z-=B);
M___49(M___49.Z-=Z) = ND2B(M___49.A-=A,M___8.Z-=B);
M___7(M___7.Z-=Z) = N1D(M___2.Z-=A);
M___2(M___2.Z-=Z) = N1C(M___2.A-=A);
M___8(M___8.Z-=Z) = N1D(M___3.Z-=A);
M___3(M___3.Z-=Z) = N1C(M___3.A-=A);
M___10(M___10.Z-=Z) = N1D(M___5.Z-=A);
M___5(M___5.Z-=Z) = N1C(M___5.A-=A);
```

```
M___6(M___6.Z-=Z) = N1D(M___1.Z-=A);
M___1(M___1.Z-=Z) = N1C(M___1.A-=A);
M___4(M___4.Z-=Z) = N1C(M___4.A-=A);
M___9(M___9.Z-=Z) = N1D(M___4.Z-=A);
M___68(M___68.Z-=Z) = ND2B(M___68.A-=A,M___9.Z-=B);
M___80(M___80.Z-=Z) = ND2B(M___80.A-=A,M___9.Z-=B);
M___50(M___50.Z-=Z) = ND2B(M___50.A-=A,M___9.Z-=B);
M___74(M___74.Z-=Z) = ND2B(M___74.A-=A,M___9.Z-=B);
M___72(M___72.Z-=Z) = ND2B(M___72.A-=A,M___7.Z-=B);
M___73(M___73.Z-=Z) = ND2B(M___73.A-=A,M___8.Z-=B);
M___71(M___71.Z-=Z) = ND2B(M___71.A-=A,M___6.Z-=B);
M___76(M___76.Z-=Z) = ND5C(M___74.Z-=D,M___75.Z-=E,M___72.Z-=B,
        M___73.Z-=C,M___71.Z-=A);
M___75(M___75.Z-=Z) = ND2B(M___75.A-=A,M___10.Z-=B);
M___56(M___56.Z-=Z) = ND2B(M___56.A-=A,M___9.Z-=B);
M___55(M___55.Z-=Z) = ND2B(M___55.A-=A,M___8.Z-=B);
M___54(M___54.Z-=Z) = ND2B(M___54.A-=A,M___7.Z-=B);
M___53(M___53.Z-=Z) = ND2B(M___53.A-=A,M___6.Z-=B);
M___58(M___58.Z-=Z) = ND5C(M___56.Z-=D,M___57.Z-=E,M___55.Z-=C,
        M___54.Z-=B,M___53.Z-=A);
M___57(M___57.Z-=Z) = ND2B(M___57.A-=A,M___10.Z-=B);
M___26(M___26.Z-=Z) = ND2B(M___26.A-=A,M___9.Z-=B);
M___25(M___25.Z-=Z) = ND2B(M___25.A-=A,M___8.Z-=B);
M___24(M___24.Z-=Z) = ND2B(M___24.A-=A,M___7.Z-=B);
M___23(M___23.Z-=Z) = ND2B(M___23.A-=A,M___6.Z-=B);
M___28(M___28.Z-=Z) = ND5C(M___26.Z-=D,M___27.Z-=E,M___25.Z-=C,
        M___24.Z-=B,M___23.Z-=A);
M___27(M___27.Z-=Z) = ND2B(M___27.A-=A,M___10.Z-=B);
M___20(M___20.Z-=Z) = ND2B(M___20.A-=A,M___9.Z-=B);
M___19(M___19.Z-=Z) = ND2B(M___19.A-=A,M___8.Z-=B);
M___18(M___18.Z-=Z) = ND2B(M___18.A-=A,M___7.Z-=B);
M___17(M___17.Z-=Z) = ND2B(M___17.A-=A,M___6.Z-=B);
M___22(M___22.Z-=Z) = ND5C(M___20.Z-=D,M___21.Z-=E,M___19.Z-=C,
        M___18.Z-=B,M___17.Z-=A);
M___21(M___21.Z-=Z) = ND2B(M___21.A-=A,M___10.Z-=B);
M___32(M___32.Z-=Z) = ND2B(M___32.A-=A,M___9.Z-=B);
M___29(M___29.Z-=Z) = ND2B(M___29.A-=A,M___6.Z-=B);
M___34(M___34.Z-=Z) = ND5C(M___32.Z-=D,M___33.Z-=E,M___31.Z-=C,
        M___30.Z-=B,M___29.Z-=A);
M___33(M___33.Z-=Z) = ND2B(M___33.A-=A,M___10.Z-=B);
M___62(M___62.Z-=Z) = ND2B(M___62.A-=A,M___9.Z-=B);
M___61(M___61.Z-=Z) = ND2B(M___61.A-=A,M___8.Z-=B);
M___60(M___60.Z-=Z) = ND2B(M___60.A-=A,M___7.Z-=B);
M___59(M___59.Z-=Z) = ND2B(M___59.A-=A,M___6.Z-=B);
M___64(M___64.Z-=Z) = ND5C(M___62.Z-=D,M___63.Z-=E,M___61.Z-=C,
        M___60.Z-=B,M___59.Z-=A);
M___63(M___63.Z-=Z) = ND2B(M___63.A-=A,M___10.Z-=B);
M___69(M___69.Z-=Z) = ND2B(M___69.A-=A,M___10.Z-=B);
M___51(M___51.Z-=Z) = ND2B(M___51.A-=A,M___10.Z-=B);
M___39(M___39.Z-=Z) = ND2B(M___39.A-=A,M___10.Z-=B);
M___15(M___15.Z-=Z) = ND2B(M___15.A-=A,M___10.Z-=B);
M___13(M___13.Z-=Z) = ND2B(M___13.A-=A,M___8.Z-=B);
M___12(M___12.Z-=Z) = ND2B(M___12.A-=A,M___7.Z-=B);
M___16(M___16.Z-=Z) = ND5C(M___14.Z-=D,M___15.Z-=E,M___13.Z-=C,
        M___12.Z-=B,M___11.Z-=A);
M___14(M___14.Z-=Z) = ND2B(M___14.A-=A,M___9.Z-=B);
M___38(M___38.Z-=Z) = ND2B(M___38.A-=A,M___9.Z-=B);
M___44(M___44.Z-=Z) = ND2B(M___44.A-=A,M___9.Z-=B);
M___43(M___43.Z-=Z) = ND2B(M___43.A-=A,M___8.Z-=B);
M___42(M___42.Z-=Z) = ND2B(M___42.A-=A,M___7.Z-=B);
M___41(M___41.Z-=Z) = ND2B(M___41.A-=A,M___6.Z-=B);
M___46(M___46.Z-=Z) = ND5C(M___44.Z-=D,M___45.Z-=E,M___43.Z-=C,
        M___42.Z-=B,M___41.Z-=A);
M___45(M___45.Z-=Z) = ND2B(M___45.A-=A,M___10.Z-=B);
M___81(M___81.Z-=Z) = ND2B(M___81.A-=A,M___10.Z-=B);
M___77(M___77.Z-=Z) = ND2B(M___77.A-=A,M___6.Z-=B);
M___78(M___78.Z-=Z) = ND2B(M___78.A-=A,M___7.Z-=B);
M___82(M___82.Z-=Z) = ND5C(M___80.Z-=D,M___81.Z-=E,M___77.Z-=A,
        M___78.Z-=B,M___79.Z-=C);
M___79(M___79.Z-=Z) = ND2B(M___79.A-=A,M___8.Z-=B);
M___31(M___31.Z-=Z) = ND2B(M___31.A-=A,M___8.Z-=B);
M___67(M___67.Z-=Z) = ND2B(M___67.A-=A,M___8.Z-=B);
M___65(M___65.Z-=Z) = ND2B(M___65.A-=A,M___6.Z-=B);
```

```
M___70(M___70.Z-=Z) = ND5C(M___68.Z-=D,M___69.Z-=E,M___67.Z-=C,
       M___66.Z-=B,M___65.Z-=A);
M___66(M___66.Z-=Z) = ND2B(M___66.A-=A,M___7.Z-=B);
M___30(M___30.Z-=Z) = ND2B(M___30.A-=A,M___7.Z-=B);
M___48(M___48.Z-=Z) = ND2B(M___48.A-=A,M___7.Z-=B);
M___52(M___52.Z-=Z) = ND5C(M___50.Z-=D,M___51.Z-=E,M___49.Z-=C,
       M___48.Z-=B,M___47.Z-=A);
M___47(M___47.Z-=Z) = ND2B(M___47.A-=A,M___6.Z-=B);
M___11(M___11.Z-=Z) = ND2B(M___11.A-=A,M___6.Z-=B);
M___35(M___35.Z-=Z) = ND2B(M___35.A-=A,M___6.Z-=B);
M___40(M___40.Z-=Z) = ND5C(M___38.Z-=D,M___39.Z-=E,M___37.Z-=C,
       M___36.Z-=B,M___35.Z-=A);


/* extractors ******************************/

D0-.4 = (M___35.A-);
Z-.6 = (M___52.Z-);
D1-.4 = (M___36.A-);
D1-.6 = (M___48.A-);
D2-.9 = (M___67.A-);
D2-.4 = (M___37.A-);
D2-.6 = (M___49.A-);
S-.1 = (M___2.A-);
S-.2 = (M___3.A-);
S-.4 = (M___5.A-);
S-.0 = (M___1.A-);
S-.3 = (M___4.A-);
D3-.9 = (M___68.A-);
D3-.11 = (M___80.A-);
D3-.6 = (M___50.A-);
D3-.10 = (M___74.A-);
D1-.10 = (M___72.A-);
D2-.10 = (M___73.A-);
Z-.10 = (M___76.Z-);
D0-.10 = (M___71.A-);
D4-.10 = (M___75.A-);
D3-.7 = (M___56.A-);
D2-.7 = (M___55.A-);
Z-.7 = (M___58.Z-);
D1-.7 = (M___54.A-);
D0-.7 = (M___53.A-);
D4-.7 = (M___57.A-);
D4-.11 = (M___81.A-);
D3-.2 = (M___26.A-);
D2-.2 = (M___25.A-);
Z-.2 = (M___28.Z-);
D1-.2 = (M___24.A-);
D0-.2 = (M___23.A-);
D4-.2 = (M___27.A-);
D3-.1 = (M___20.A-);
D2-.1 = (M___19.A-);
Z-.1 = (M___22.Z-);
D1-.1 = (M___18.A-);
D0-.1 = (M___17.A-);
D4-.1 = (M___21.A-);
D3-.3 = (M___32.A-);
Z-.3 = (M___34.Z-);
D0-.3 = (M___29.A-);
D4-.3 = (M___33.A-);
D3-.8 = (M___62.A-);
D2-.8 = (M___61.A-);
Z-.8 = (M___64.Z-);
D1-.8 = (M___60.A-);
D0-.8 = (M___59.A-);
D4-.8 = (M___63.A-);
D4-.9 = (M___69.A-);
D4-.6 = (M___51.A-);
D4-.5 = (M___45.A-);
D4-.4 = (M___39.A-);
D4-.0 = (M___15.A-);
D2-.0 = (M___13.A-);
Z-.0 = (M___16.Z-);
```

```
    D1-.0 = (M___12.A-);
    D3-.0 = (M___14.A-);
    D3-.5 = (M___44.A-);
    D3-.4 = (M___38.A-);
    D2-.5 = (M___43.A-);
    Z-.5 = (M___46.Z-);
    D1-.5 = (M___42.A-);
    D0-.5 = (M___41.A-);
    D0-.11 = (M___77.A-);
    D1-.11 = (M___78.A-);
    Z-.11 = (M___82.Z-);
    D2-.11 = (M___79.A-);
    D2-.3 = (M___31.A-);
    Z-.9 = (M___70.Z-);
    D0-.9 = (M___65.A-);
    D1-.9 = (M___66.A-);
    D1-.3 = (M___30.A-);
    D0-.6 = (M___47.A-);
    D0-.0 = (M___11.A-);
    Z-.4 = (M___40.Z-);


  /* type converters *********************/

ANNOTATIONS
{
  BUS BUS_TYPE = "DOT";
}

END MODULE;


/* * * * * * *  Contents of NET file MEM16X60.NET  * * * * * * */

/******************************************************/
/*  Netlist copyright (C) 1989 LSI Logic Corporation  */
/******************************************************/


MODULE MEM16X60;

INPUTS       ADR.3,ADR.2,ADR.1,ADR.0,ALE,DI.11,DI.10,DI.9,DI.8,
             DI.7,DI.6,DI.5,DI.4,DI.3,DI.2,DI.1,DI.0,W0E,W1E,W2E,
             W3E,W4E,WE;
OUTPUTS      DO.59,DO.58,DO.57,DO.56,DO.55,DO.54,DO.53,DO.52,DO.51,
             DO.50,DO.49,DO.48,DO.47,DO.46,DO.45,DO.44,DO.43,DO.42,
             DO.41,DO.40,DO.39,DO.38,DO.37,DO.36,DO.35,DO.34,DO.33,
             DO.32,DO.31,DO.30,DO.29,DO.28,DO.27,DO.26,DO.25,DO.24,
             DO.23,DO.22,DO.21,DO.20,DO.19,DO.18,DO.17,DO.16,DO.15,
             DO.14,DO.13,DO.12,DO.11,DO.10,DO.9,DO.8,DO.7,DO.6,
             DO.5,DO.4,DO.3,DO.2,DO.1,DO.0,PDO.11,PDO.10,PDO.9,
             PDO.8,PDO.7,PDO.6,PDO.5,PDO.4,PDO.3,PDO.2,PDO.1,PDO.0;

LEVEL FUNCTION;
DEFINE
  /* implicit connectors ******************/

    DI-.11 = (DI.11);
    DI-.10 = (DI.10);
    DI-.9 = (DI.9);
    DI-.8 = (DI.8);
    DI-.7 = (DI.7);
    DI-.6 = (DI.6);
    DI-.5 = (DI.5);
    DI-.4 = (DI.4);
    DI-.3 = (DI.3);
    DI-.2 = (DI.2);
    DI-.1 = (DI.1);
    DI-.0 = (DI.0);
    U1.OCK- = (NC/1/);
    U1.SCK- = (NC/0/);
    WE- = (WE);
```

```
ADR-.3 = (ADR.3);
ADR-.2 = (ADR.2);
ADR-.1 = (ADR.1);
ADR-.0 = (ADR.0);
ALE- = (ALE);
DO-.59 = (DO.59);
DO-.58 = (DO.58);
DO-.57 = (DO.57);
DO-.56 = (DO.56);
DO-.55 = (DO.55);
DO-.54 = (DO.54);
DO-.53 = (DO.53);
DO-.52 = (DO.52);
DO-.51 = (DO.51);
DO-.50 = (DO.50);
DO-.49 = (DO.49);
DO-.48 = (DO.48);
DO-.47 = (DO.47);
DO-.46 = (DO.46);
DO-.45 = (DO.45);
DO-.44 = (DO.44);
DO-.43 = (DO.43);
DO-.42 = (DO.42);
DO-.41 = (DO.41);
DO-.40 = (DO.40);
DO-.39 = (DO.39);
DO-.38 = (DO.38);
DO-.37 = (DO.37);
DO-.36 = (DO.36);
DO-.35 = (DO.35);
DO-.34 = (DO.34);
DO-.33 = (DO.33);
DO-.32 = (DO.32);
DO-.31 = (DO.31);
DO-.30 = (DO.30);
DO-.29 = (DO.29);
DO-.28 = (DO.28);
DO-.27 = (DO.27);
DO-.26 = (DO.26);
DO-.25 = (DO.25);
DO-.24 = (DO.24);
DO-.23 = (DO.23);
DO-.22 = (DO.22);
DO-.21 = (DO.21);
DO-.20 = (DO.20);
DO-.19 = (DO.19);
DO-.18 = (DO.18);
DO-.17 = (DO.17);
DO-.16 = (DO.16);
DO-.15 = (DO.15);
DO-.14 = (DO.14);
DO-.13 = (DO.13);
DO-.12 = (DO.12);
DO-.11 = (DO.11);
DO-.10 = (DO.10);
DO-.9 = (DO.9);
DO-.8 = (DO.8);
DO-.7 = (DO.7);
DO-.6 = (DO.6);
DO-.5 = (DO.5);
DO-.4 = (DO.4);
DO-.3 = (DO.3);
DO-.2 = (DO.2);
DO-.1 = (DO.1);
DO-.0 = (DO.0);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
```

```
PDO-.3 = (PDO.3);
PDO-.2 = (PDO.2);
PDO-.1 = (PDO.1);
PDO-.0 = (PDO.0);
W1E- = (W1E);
W1E- = (W1E);
W4E- = (W4E);
W4E- = (W4E);
W0E- = (W0E);
W0E- = (W0E);
W2E- = (W2E);
W3E- = (W3E);
W3E- = (W3E);
W2E- = (W2E);


/* part instances ***************************/

U1(DO-.59=DO59,DO-.58=DO58,DO-.57=DO57,DO-.56=DO56,DO-.55=DO55,
        DO-.54=DO54,DO-.53=DO53,DO-.52=DO52,DO-.51=DO51,
        DO-.50=DO50,DO-.49=DO49,DO-.48=DO48,DO-.47=DO47,
        DO-.46=DO46,DO-.45=DO45,DO-.44=DO44,DO-.43=DO43,
        DO-.42=DO42,DO-.41=DO41,DO-.40=DO40,DO-.39=DO39,
        DO-.38=DO38,DO-.37=DO37,DO-.36=DO36,DO-.35=DO35,
        DO-.34=DO34,DO-.33=DO33,DO-.32=DO32,DO-.31=DO31,
        DO-.30=DO30,DO-.29=DO29,DO-.28=DO28,DO-.27=DO27,
        DO-.26=DO26,DO-.25=DO25,DO-.24=DO24,DO-.23=DO23,
        DO-.22=DO22,DO-.21=DO21,DO-.20=DO20,DO-.19=DO19,
        DO-.18=DO18,DO-.17=DO17,DO-.16=DO16,DO-.15=DO15,
        DO-.14=DO14,DO-.13=DO13,DO-.12=DO12,DO-.11=DO11,
        DO-.10=DO10,DO-.9=DO9,DO-.8=DO8,DO-.7=DO7,DO-.6=DO6,
        DO-.5=DO5,DO-.4=DO4,DO-.3=DO3,DO-.2=DO2,DO-.1=DO1,
        DO-.0=DO0) = RR16X60(U1.DI-.59=DI59,U1.DI-.58=DI58,
        U1.DI-.57=DI57,U1.DI-.56=DI56,U1.DI-.55=DI55,
        U1.DI-.54=DI54,U1.DI-.53=DI53,U1.DI-.52=DI52,
        U1.DI-.51=DI51,U1.DI-.50=DI50,U1.DI-.49=DI49,
        U1.DI-.48=DI48,U1.DI-.47=DI47,U1.DI-.46=DI46,
        U1.DI-.45=DI45,U1.DI-.44=DI44,U1.DI-.43=DI43,
        U1.DI-.42=DI42,U1.DI-.41=DI41,U1.DI-.40=DI40,
        U1.DI-.39=DI39,U1.DI-.38=DI38,U1.DI-.37=DI37,
        U1.DI-.36=DI36,U1.DI-.35=DI35,U1.DI-.34=DI34,
        U1.DI-.33=DI33,U1.DI-.32=DI32,U1.DI-.31=DI31,
        U1.DI-.30=DI30,U1.DI-.29=DI29,U1.DI-.28=DI28,
        U1.DI-.27=DI27,U1.DI-.26=DI26,U1.DI-.25=DI25,
        U1.DI-.24=DI24,U1.DI-.23=DI23,U1.DI-.22=DI22,
        U1.DI-.21=DI21,U1.DI-.20=DI20,U1.DI-.19=DI19,
        U1.DI-.18=DI18,U1.DI-.17=DI17,U1.DI-.16=DI16,
        U1.DI-.15=DI15,U1.DI-.14=DI14,U1.DI-.13=DI13,
        U1.DI-.12=DI12,U1.DI-.11=DI11,U1.DI-.10=DI10,U1.DI-.9=DI9,
        U1.DI-.8=DI8,U1.DI-.7=DI7,U1.DI-.6=DI6,U1.DI-.5=DI5,
        U1.DI-.4=DI4,U1.DI-.3=DI3,U1.DI-.2=DI2,U1.DI-.1=DI1,
        U1.DI-.0=DI0,U1.WBS-.14=WBS14,U1.WBS-.13=WBS13,
        U1.WBS-.12=WBS12,U1.WBS-.11=WBS11,U1.WBS-.10=WBS10,
        U1.WBS-.9=WBS9,U1.WBS-.8=WBS8,U1.WBS-.7=WBS7,
        U1.WBS-.6=WBS6,U1.WBS-.5=WBS5,U1.WBS-.4=WBS4,
        U1.WBS-.3=WBS3,U1.WBS-.2=WBS2,U1.WBS-.1=WBS1,
        U1.WBS-.0=WBS0,U1.OCK-=ICKDATA,U1.OCK-=OCK,U1.OEN-.14=OEN14,
        U1.OEN-.13=OEN13,U1.OEN-.12=OEN12,U1.OEN-.11=OEN11,
        U1.OEN-.10=OEN10,U1.OEN-.9=OEN9,U1.OEN-.8=OEN8,
        U1.OEN-.7=OEN7,U1.OEN-.6=OEN6,U1.OEN-.5=OEN5,
        U1.OEN-.4=OEN4,U1.OEN-.3=OEN3,U1.OEN-.2=OEN2,
        U1.OEN-.1=OEN1,U1.OEN-.0=OEN0,U1.SCK-=TWE,U1.SCK-=TOCK,
        U1.SCK-=T,U1.SCK-=SI,U1.SCK-=SCK,WE-=WE,ADR-.3=ADR3,
        ADR-.2=ADR2,ADR-.1=ADR1,ADR-.0=ADR0,ALE-=ICKADR);
U0(PDO-.11=Z.11,PDO-.10=Z.10,PDO-.9=Z.9,PDO-.8=Z.8,PDO-.7=Z.7,
        PDO-.6=Z.6,PDO-.5=Z.5,PDO-.4=Z.4,PDO-.3=Z.3,PDO-.2=Z.2,
        PDO-.1=Z.1,PDO-.0=Z.0) = MX5W12(U0.D0-.11=D0.11,
        U0.D0-.10=D0.10,U0.D0-.9=D0.9,U0.D0-.8=D0.8,U0.D0-.7=D0.7,
        U0.D0-.6=D0.6,U0.D0-.5=D0.5,U0.D0-.4=D0.4,U0.D0-.3=D0.3,
        U0.D0-.2=D0.2,U0.D0-.1=D0.1,U0.D0-.0=D0.0,U0.D1-.11=D1.11,
        U0.D1-.10=D1.10,U0.D1-.9=D1.9,U0.D1-.8=D1.8,U0.D1-.7=D1.7,
        U0.D1-.6=D1.6,U0.D1-.5=D1.5,U0.D1-.4=D1.4,U0.D1-.3=D1.3,
        U0.D1-.2=D1.2,U0.D1-.1=D1.1,U0.D1-.0=D1.0,U0.D4-.11=D4.11,
```

```
U0.D4-.10=D4.10,U0.D4-.9=D4.9,U0.D4-.8=D4.8,U0.D4-.7=D4.7,
U0.D4-.6=D4.6,U0.D4-.5=D4.5,U0.D4-.4=D4.4,U0.D4-.3=D4.3,
U0.D4-.2=D4.2,U0.D4-.1=D4.1,U0.D4-.0=D4.0,U0.D3-.11=D3.11,
U0.D3-.10=D3.10,U0.D3-.9=D3.9,U0.D3-.8=D3.8,U0.D3-.7=D3.7,
U0.D3-.6=D3.6,U0.D3-.5=D3.5,U0.D3-.4=D3.4,U0.D3-.3=D3.3,
U0.D3-.2=D3.2,U0.D3-.1=D3.1,U0.D3-.0=D3.0,U0.D2-.11=D2.11,
U0.D2-.10=D2.10,U0.D2-.9=D2.9,U0.D2-.8=D2.8,U0.D2-.7=D2.7,
U0.D2-.6=D2.6,U0.D2-.5=D2.5,U0.D2-.4=D2.4,U0.D2-.3=D2.3,
U0.D2-.2=D2.2,U0.D2-.1=D2.1,U0.D2-.0=D2.0,U0.S-.4=S.4,
U0.S-.3=S.3,U0.S-.2=S.2,U0.S-.1=S.1,U0.S-.0=S.0);

/* extractors *******************************/

U1.WBS-.8 = (W2E-);
U1.WBS-.6 = (W2E-);
U1.WBS-.10 = (W3E-);
U1.DI-.11 = (DI-.11);
U1.DI-.10 = (DI-.10);
U1.DI-.9 = (DI-.9);
U1.DI-.8 = (DI-.8);
U1.DI-.7 = (DI-.7);
U1.DI-.6 = (DI-.6);
U1.DI-.5 = (DI-.5);
U1.DI-.4 = (DI-.4);
U1.DI-.3 = (DI-.3);
U1.DI-.2 = (DI-.2);
U1.DI-.1 = (DI-.1);
U1.DI-.0 = (DI-.0);
U1.DI-.35 = (DI-.11);
U1.DI-.34 = (DI-.10);
U1.DI-.33 = (DI-.9);
U1.DI-.32 = (DI-.8);
U1.DI-.31 = (DI-.7);
U1.DI-.30 = (DI-.6);
U1.DI-.29 = (DI-.5);
U1.DI-.28 = (DI-.4);
U1.DI-.27 = (DI-.3);
U1.DI-.26 = (DI-.2);
U1.DI-.25 = (DI-.1);
U1.DI-.24 = (DI-.0);
U1.DI-.23 = (DI-.11);
U1.DI-.22 = (DI-.10);
U1.DI-.21 = (DI-.9);
U1.DI-.20 = (DI-.8);
U1.DI-.19 = (DI-.7);
U1.DI-.18 = (DI-.6);
U1.DI-.17 = (DI-.5);
U1.DI-.16 = (DI-.4);
U1.DI-.15 = (DI-.3);
U1.DI-.14 = (DI-.2);
U1.DI-.13 = (DI-.1);
U1.DI-.12 = (DI-.0);
U1.DI-.59 = (DI-.11);
U1.DI-.58 = (DI-.10);
U1.DI-.57 = (DI-.9);
U1.DI-.56 = (DI-.8);
U1.DI-.55 = (DI-.7);
U1.DI-.54 = (DI-.6);
U1.DI-.53 = (DI-.5);
U1.DI-.52 = (DI-.4);
U1.DI-.51 = (DI-.3);
U1.DI-.50 = (DI-.2);
U1.DI-.49 = (DI-.1);
U1.DI-.48 = (DI-.0);
U1.DI-.47 = (DI-.11);
U1.DI-.46 = (DI-.10);
U1.DI-.45 = (DI-.9);
U1.DI-.44 = (DI-.8);
U1.DI-.43 = (DI-.7);
U1.DI-.42 = (DI-.6);
U1.DI-.41 = (DI-.5);
U1.DI-.40 = (DI-.4);
```

```
U1.DI-.39 = (DI-.3);
U1.DI-.38 = (DI-.2);
U1.DI-.37 = (DI-.1);
U1.DI-.36 = (DI-.0);
U1.OEN-.6 = (U1.SCK-);
U1.OEN-.8 = (U1.SCK-);
U1.OEN-.0 = (U1.SCK-);
U1.OEN-.5 = (U1.SCK-);
U1.OEN-.2 = (U1.SCK-);
U1.OEN-.1 = (U1.SCK-);
U1.OEN-.10 = (U1.SCK-);
U1.OEN-.11 = (U1.SCK-);
U1.OEN-.13 = (U1.SCK-);
U1.OEN-.9 = (U1.SCK-);
U1.OEN-.7 = (U1.SCK-);
U1.OEN-.14 = (U1.SCK-);
U1.OEN-.12 = (U1.SCK-);
U1.OEN-.4 = (U1.SCK-);
U1.OEN-.3 = (U1.SCK-);
DO-.11 = (U0.D0-.11);
DO-.10 = (U0.D0-.10);
DO-.9 = (U0.D0-.9);
DO-.8 = (U0.D0-.8);
DO-.7 = (U0.D0-.7);
DO-.6 = (U0.D0-.6);
DO-.5 = (U0.D0-.5);
DO-.4 = (U0.D0-.4);
DO-.3 = (U0.D0-.3);
DO-.2 = (U0.D0-.2);
DO-.1 = (U0.D0-.1);
DO-.0 = (U0.D0-.0);
DO-.59 = (U0.D4-.11);
DO-.58 = (U0.D4-.10);
DO-.57 = (U0.D4-.9);
DO-.56 = (U0.D4-.8);
DO-.55 = (U0.D4-.7);
DO-.54 = (U0.D4-.6);
DO-.53 = (U0.D4-.5);
DO-.52 = (U0.D4-.4);
DO-.51 = (U0.D4-.3);
DO-.50 = (U0.D4-.2);
DO-.49 = (U0.D4-.1);
DO-.48 = (U0.D4-.0);
DO-.23 = (U0.D1-.11);
DO-.22 = (U0.D1-.10);
DO-.21 = (U0.D1-.9);
DO-.20 = (U0.D1-.8);
DO-.19 = (U0.D1-.7);
DO-.18 = (U0.D1-.6);
DO-.17 = (U0.D1-.5);
DO-.16 = (U0.D1-.4);
DO-.15 = (U0.D1-.3);
DO-.14 = (U0.D1-.2);
DO-.13 = (U0.D1-.1);
DO-.12 = (U0.D1-.0);
DO-.47 = (U0.D3-.11);
DO-.46 = (U0.D3-.10);
DO-.45 = (U0.D3-.9);
DO-.44 = (U0.D3-.8);
DO-.43 = (U0.D3-.7);
DO-.42 = (U0.D3-.6);
DO-.41 = (U0.D3-.5);
DO-.40 = (U0.D3-.4);
DO-.39 = (U0.D3-.3);
DO-.38 = (U0.D3-.2);
DO-.37 = (U0.D3-.1);
DO-.36 = (U0.D3-.0);
DO-.35 = (U0.D2-.11);
DO-.34 = (U0.D2-.10);
DO-.33 = (U0.D2-.9);
DO-.32 = (U0.D2-.8);
DO-.31 = (U0.D2-.7);
DO-.30 = (U0.D2-.6);
```

```
DO-.29 = (U0.D2-.5);
DO-.28 = (U0.D2-.4);
DO-.27 = (U0.D2-.3);
DO-.26 = (U0.D2-.2);
DO-.25 = (U0.D2-.1);
DO-.24 = (U0.D2-.0);
U1.WBS-.5 = (W1E-);
U1.WBS-.4 = (W1E-);
U1.WBS-.3 = (W1E-);
U0.S-.1 = (W1E-);
U1.WBS-.13 = (W4E-);
U1.WBS-.12 = (W4E-);
U1.WBS-.14 = (W4E-);
U0.S-.4 = (W4E-);
U1.WBS-.2 = (W0E-);
U1.WBS-.0 = (W0E-);
U1.WBS-.1 = (W0E-);
U0.S-.0 = (W0E-);
U0.S-.2 = (W2E-);
U0.S-.3 = (W3E-);
U1.WBS-.11 = (W3E-);
U1.WBS-.9 = (W3E-);
U1.WBS-.7 = (W2E-);

/* type converters *********************/

ANNOTATIONS
{
  BUS BUS_TYPE = "DOT";
}

END MODULE;


/* * * * * * *  Contents of NET file CMEMDECV1.NET  * * * * * * */

/*******************************************************/
/*  Netlist copyright (C) 1989 LSI Logic Corporation   */
/*******************************************************/


MODULE CMEMDECV1;

INPUTS      CS_,OPR,PA0,PA1,PA2,WR_;
OUTPUTS     W0E,W1E,W2E,W3E,W4E,WE;

LEVEL FUNCTION;
DEFINE
  /* implicit connectors *******************/

    W2E- = (W2E);
    W1E- = (W1E);
    W3E- = (W3E);
    PA0- = (PA0);
    WE- = (WE);
    WR_- = (WR_);
    W4E- = (W4E);
    PA2- = (PA2);
    CS_- = (CS_);
    OPR- = (OPR);
    W0E- = (W0E);
    PA1- = (PA1);


  /* part instances *************************/

    M28(W2E-=Z) = N1B(M16.Z-=A);
    M27(W1E-=Z) = N1B(M19.Z-=A);
    M4(M4.Z-=Z) = N1B(PA1-=A);
    M29(W3E-=Z) = N1B(M22.Z-=A);
    M3(M3.Z-=Z) = N1B(PA0-=A);
```

```
M20(M20.Z-=Z) = AND2B(PA0-=A,PA1-=B);
M22(M22.Z-=Z) = ND3B(M9.Z-=C,M8.Z-=B,M20.Z-=A);
M25(WE-=Z) = N1B(M24.Z-=A);
M23(M23.Z-=Z) = N1B(WR_-=A);
M30(W4E-=Z) = N1B(M13.Z-=A);
M13(M13.Z-=Z) = ND3B(M9.Z-=C,M12.Z-=B,M5.Z-=A);
M12(M12.Z-=Z) = AND2B(PA2-=A,M7.Z-=B);
M6(M6.Z-=Z) = N1B(PA2-=A);
M8(M8.Z-=Z) = AND2C(M7.Z-=B,M6.Z-=A);
M7(M7.Z-=Z) = N1B(CS_-=A);
M24(M24.Z-=Z) = ND3B(M9.Z-=C,M23.Z-=A,M7.Z-=B);
M9(M9.Z-=Z) = N1C(OPR-=A);
M26(WOE-=Z) = N1B(M10.Z-=A);
M10(M10.Z-=Z) = ND3B(M9.Z-=C,M8.Z-=B,M5.Z-=A);
M5(M5.Z-=Z) = AND2B(M3.Z-=A,M4.Z-=B);
M17(M17.Z-=Z) = AND2B(PA0-=A,M4.Z-=B);
M19(M19.Z-=Z) = ND3B(M9.Z-=C,M8.Z-=B,M17.Z-=A);
M16(M16.Z-=Z) = ND3B(M9.Z-=C,M8.Z-=B,M14.Z-=A);
M14(M14.Z-=Z) = AND2B(PA1-=B,M3.Z-=A);


/* extractors ******************************/


/* type converters *********************/

ANNOTATIONS
{
  BUS BUS_TYPE = "DOT";
}

END MODULE;


/* * * * * * *  Contents of NET file PDMX1.NET  * * * * * * */

/*******************************************************/
/*  Netlist copyright (C) 1989 LSI Logic Corporation  */
/*******************************************************/


MODULE PDMX1;

INPUTS      CLRXAU,CLRYAU,CNVL.12,CNVL.11,CNVL.10,CNVL.9,CNVL.8,
            CNVL.7,CNVL.6,CNVL.5,CNVL.4,CNVL.3,CNVL.2,CNVL.1,
            CNVL.0,DUP,EENYAU,ENXAU,FRSTROW,INCY,LSTROW,LSTROW_1,
            PD2.15,PD2.14,PD2.13,PD2.12,PD2.11,PD2.10,PD2.9,PD2.8,
            PD2.7,PD2.6,PD2.5,PD2.4,PD2.3,PD2.2,PD2.1,PD2.0,
            PDO1.11,PDO1.10,PDO1.9,PDO1.8,PDO1.7,PDO1.6,PDO1.5,
            PDO1.4,PDO1.3,PDO1.2,PDO1.1,PDO1.0,SCNDROW,SE,SEL00,
            SEL01,SPR.1,SPR.0,XINT_GT_1,YINCEN,YINT_GT_1;
OUTPUTS     PDO.15,PDO.14,PDO.13,PDO.12,PDO.11,PDO.10,PDO.9,PDO.8,
            PDO.7,PDO.6,PDO.5,PDO.4,PDO.3,PDO.2,PDO.1,PDO.0;

LEVEL FUNCTION;
DEFINE
  /* implicit connectors *******************/

    DUP- = (DUP);
    LSTROW_1- = (LSTROW_1);
    EENYAU- = (EENYAU);
    CLRXAU- = (CLRXAU);
    ENXAU- = (ENXAU);
    FRSTROW- = (FRSTROW);
    CLRYAU- = (CLRYAU);
    YINCEN- = (YINCEN);
    XINT_GT_1- = (XINT_GT_1);
    SE- = (SE);
    SCNDROW- = (SCNDROW);
    PD2-.15 = (PD2.15);
    PD2-.14 = (PD2.14);
```

```
PD2-.13 = (PD2.13);
PD2-.12 = (PD2.12);
PD2-.11 = (PD2.11);
PD2-.10 = (PD2.10);
PD2-.9 = (PD2.9);
PD2-.8 = (PD2.8);
PD2-.7 = (PD2.7);
PD2-.6 = (PD2.6);
PD2-.5 = (PD2.5);
PD2-.4 = (PD2.4);
PD2-.3 = (PD2.3);
PD2-.2 = (PD2.2);
PD2-.1 = (PD2.1);
PD2-.0 = (PD2.0);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
M-0 = (NC/0/);
M-1 = (NC/0/);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
SEL01- = (SEL01);
SEL00- = (SEL00);
LSTROW- = (LSTROW);
INCY- = (INCY);
SPR-.1 = (SPR.1);
SPR-.0 = (SPR.0);
YINT_GT_1- = (YINT_GT_1);


/* part instances ***************************/

U0.15(PDO-.15=Z) = MUX41B(U0.D0-.15=D0,PD2-.15=D1,U0.D2-.15=D2,
        U0.D3-.15=D3,SEL01-=B,SEL00-=A);
U0.14(PDO-.14=Z) = MUX41B(U0.D0-.14=D0,PD2-.14=D1,U0.D2-.14=D2,
        U0.D3-.14=D3,SEL01-=B,SEL00-=A);
U0.13(PDO-.13=Z) = MUX41B(U0.D0-.13=D0,PD2-.13=D1,U0.D2-.13=D2,
        U0.D3-.13=D3,SEL01-=B,SEL00-=A);
```

```
U0.12(PDO-.12=Z) = MUX41B(U0.D0-.12=D0,PD2-.12=D1,U0.D2-.12=D2,
        U0.D3-.12=D3,SEL01-=B,SEL00-=A);
U0.11(PDO-.11=Z) = MUX41B(U0.D0-.11=D0,PD2-.11=D1,U0.D2-.11=D2,
        U0.D3-.11=D3,SEL01-=B,SEL00-=A);
U0.10(PDO-.10=Z) = MUX41B(U0.D0-.10=D0,PD2-.10=D1,U0.D2-.10=D2,
        U0.D3-.10=D3,SEL01-=B,SEL00-=A);
U0.9(PDO-.9=Z) = MUX41B(U0.D0-.9=D0,PD2-.9=D1,U0.D2-.9=D2,
        U0.D3-.9=D3,SEL01-=B,SEL00-=A);
U0.8(PDO-.8=Z) = MUX41B(U0.D0-.8=D0,PD2-.8=D1,U0.D2-.8=D2,
        U0.D3-.8=D3,SEL01-=B,SEL00-=A);
U0.7(PDO-.7=Z) = MUX41B(U0.D0-.7=D0,PD2-.7=D1,U0.D2-.7=D2,
        U0.D3-.7=D3,SEL01-=B,SEL00-=A);
U0.6(PDO-.6=Z) = MUX41B(U0.D0-.6=D0,PD2-.6=D1,U0.D2-.6=D2,
        U0.D3-.6=D3,SEL01-=B,SEL00-=A);
U0.5(PDO-.5=Z) = MUX41B(U0.D0-.5=D0,PD2-.5=D1,U0.D2-.5=D2,
        U0.D3-.5=D3,SEL01-=B,SEL00-=A);
U0.4(PDO-.4=Z) = MUX41B(U0.D0-.4=D0,PD2-.4=D1,U0.D2-.4=D2,
        U0.D3-.4=D3,SEL01-=B,SEL00-=A);
U0.3(PDO-.3=Z) = MUX41B(U0.D0-.3=D0,PD2-.3=D1,U0.D2-.3=D2,
        U0.D3-.3=D3,SEL01-=B,SEL00-=A);
U0.2(PDO-.2=Z) = MUX41B(U0.D0-.2=D0,PD2-.2=D1,U0.D2-.2=D2,
        U0.D3-.2=D3,SEL01-=B,SEL00-=A);
U0.1(PDO-.1=Z) = MUX41B(U0.D0-.1=D0,PD2-.1=D1,U0.D2-.1=D2,
        U0.D3-.1=D3,SEL01-=B,SEL00-=A);
U0.0(PDO-.0=Z) = MUX41B(U0.D0-.0=D0,PD2-.0=D1,U0.D2-.0=D2,
        U0.D3-.0=D3,SEL01-=B,SEL00-=A);


/* extractors *****************************/

U0.D2-.8 = (DUP-);
U0.D2-.12 = (LSTROW_1-);
U0.D2-.4 = (EENYAU-);
U0.D2-.0 = (CLRXAU-);
U0.D2-.1 = (ENXAU-);
U0.D2-.10 = (FRSTROW-);
U0.D2-.3 = (CLRYAU-);
U0.D2-.5 = (YINCEN-);
U0.D2-.2 = (XINT_GT_1-);
U0.D2-.9 = (SE-);
U0.D2-.11 = (SCNDROW-);
U0.D3-.11 = (PDO1-.11);
U0.D3-.10 = (PDO1-.10);
U0.D3-.9 = (PDO1-.9);
U0.D3-.8 = (PDO1-.8);
U0.D3-.7 = (PDO1-.7);
U0.D3-.6 = (PDO1-.6);
U0.D3-.5 = (PDO1-.5);
U0.D3-.4 = (PDO1-.4);
U0.D3-.3 = (PDO1-.3);
U0.D3-.2 = (PDO1-.2);
U0.D3-.1 = (PDO1-.1);
U0.D3-.0 = (PDO1-.0);
U0.D3-.12 = (M-1);
U0.D3-.13 = (M-1);
U0.D0-.12 = (CNVL-.12);
U0.D0-.11 = (CNVL-.11);
U0.D0-.10 = (CNVL-.10);
U0.D0-.9 = (CNVL-.9);
U0.D0-.8 = (CNVL-.8);
U0.D0-.7 = (CNVL-.7);
U0.D0-.6 = (CNVL-.6);
U0.D0-.5 = (CNVL-.5);
U0.D0-.4 = (CNVL-.4);
U0.D0-.3 = (CNVL-.3);
U0.D0-.2 = (CNVL-.2);
U0.D0-.1 = (CNVL-.1);
U0.D0-.0 = (CNVL-.0);
U0.D0-.14 = (M-0);
U0.D0-.13 = (M-0);
U0.D0-.15 = (M-0);
U0.D3-.14 = (M-1);
U0.D3-.15 = (M-1);
```

```
    U0.D2-.13 = (LSTROW-);
    U0.D2-.6 = (INCY-);
    U0.D2-.14 = (M-2);
    SPR-.0 = (M-2);
    SPR-.1 = (M-3);
    U0.D2-.15 = (M-3);
    U0.D2-.7 = (YINT_GT_1-);


  /* type converters *********************/

ANNOTATIONS
{
  BUS BUS_TYPE = "DOT";
}

END MODULE;



/* * * * * * *  Contents of NET file CMEM.NET  * * * * * * */

/*******************************************************/
/*  Netlist copyright (C) 1989 LSI Logic Corporation  */
/*******************************************************/


MODULE CMEM;

INPUTS       ADDR.3,ADDR.2,ADDR.1,ADDR.0,ALE,CP,CS_,PA.6,PA.5,PA.4,
             PA.3,PA.2,PA.1,PA.0,PDI.11,PDI.10,PDI.9,PDI.8,PDI.7,
             PDI.6,PDI.5,PDI.4,PDI.3,PDI.2,PDI.1,PDI.0,RESET_,TST,
             WAIT,WR_;
OUTPUTS      DO.59,DO.58,DO.57,DO.56,DO.55,DO.54,DO.53,DO.52,DO.51,
             DO.50,DO.49,DO.48,DO.47,DO.46,DO.45,DO.44,DO.43,DO.42,
             DO.41,DO.40,DO.39,DO.38,DO.37,DO.36,DO.35,DO.34,DO.33,
             DO.32,DO.31,DO.30,DO.29,DO.28,DO.27,DO.26,DO.25,DO.24,
             DO.23,DO.22,DO.21,DO.20,DO.19,DO.18,DO.17,DO.16,DO.15,
             DO.14,DO.13,DO.12,DO.11,DO.10,DO.9,DO.8,DO.7,DO.6,
             DO.5,DO.4,DO.3,DO.2,DO.1,DO.0,PDO1.11,PDO1.10,PDO1.9,
             PDO1.8,PDO1.7,PDO1.6,PDO1.5,PDO1.4,PDO1.3,PDO1.2,
             PDO1.1,PDO1.0;

LEVEL FUNCTION;
DEFINE
  /* implicit connectors *******************/

    WR_- = (WR_);
    TST- = (TST);
    WAIT- = (WAIT);
    CP- = (CP);
    DO-.59 = (DO.59);
    DO-.58 = (DO.58);
    DO-.57 = (DO.57);
    DO-.56 = (DO.56);
    DO-.55 = (DO.55);
    DO-.54 = (DO.54);
    DO-.53 = (DO.53);
    DO-.52 = (DO.52);
    DO-.51 = (DO.51);
    DO-.50 = (DO.50);
    DO-.49 = (DO.49);
    DO-.48 = (DO.48);
    DO-.47 = (DO.47);
    DO-.46 = (DO.46);
    DO-.45 = (DO.45);
    DO-.44 = (DO.44);
    DO-.43 = (DO.43);
    DO-.42 = (DO.42);
    DO-.41 = (DO.41);
    DO-.40 = (DO.40);
    DO-.39 = (DO.39);
    DO-.38 = (DO.38);
```

```
DO-.37 = (DO.37);
DO-.36 = (DO.36);
DO-.35 = (DO.35);
DO-.34 = (DO.34);
DO-.33 = (DO.33);
DO-.32 = (DO.32);
DO-.31 = (DO.31);
DO-.30 = (DO.30);
DO-.29 = (DO.29);
DO-.28 = (DO.28);
DO-.27 = (DO.27);
DO-.26 = (DO.26);
DO-.25 = (DO.25);
DO-.24 = (DO.24);
DO-.23 = (DO.23);
DO-.22 = (DO.22);
DO-.21 = (DO.21);
DO-.20 = (DO.20);
DO-.19 = (DO.19);
DO-.18 = (DO.18);
DO-.17 = (DO.17);
DO-.16 = (DO.16);
DO-.15 = (DO.15);
DO-.14 = (DO.14);
DO-.13 = (DO.13);
DO-.12 = (DO.12);
DO-.11 = (DO.11);
DO-.10 = (DO.10);
DO-.9 = (DO.9);
DO-.8 = (DO.8);
DO-.7 = (DO.7);
DO-.6 = (DO.6);
DO-.5 = (DO.5);
DO-.4 = (DO.4);
DO-.3 = (DO.3);
DO-.2 = (DO.2);
DO-.1 = (DO.1);
DO-.0 = (DO.0);
RESET_- = (RESET_);
BRESET_- = (BRESET_);
BRESET_- = (BRESET_);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
ADDR-.3 = (ADDR.3);
ADDR-.2 = (ADDR.2);
ADDR-.1 = (ADDR.1);
ADDR-.0 = (ADDR.0);
ALE- = (ALE);
CS_- = (CS_);
CS_- = (CS_);
CS_- = (CS_);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
```

```
  PA-.6 = (PA.6);
  PA-.5 = (PA.5);
  PA-.4 = (PA.4);
  PA-.3 = (PA.3);
  PA-.2 = (PA.2);
  PA-.1 = (PA.1);
  PA-.0 = (PA.0);


/* part instances **************************/

  U5(BRESET_-=Z) = B3A(RESET_-=A);
  U1.59(DO-.59=Q) = FD2SA(WAIT-=TE,DO-.59=TI,CP-=CP,U2.DO-.59=D,
          BRESET_-=CD);
  U1.58(DO-.58=Q) = FD2SA(WAIT-=TE,DO-.58=TI,CP-=CP,U2.DO-.58=D,
          BRESET_-=CD);
  U1.57(DO-.57=Q) = FD2SA(WAIT-=TE,DO-.57=TI,CP-=CP,U2.DO-.57=D,
          BRESET_-=CD);
  U1.56(DO-.56=Q) = FD2SA(WAIT-=TE,DO-.56=TI,CP-=CP,U2.DO-.56=D,
          BRESET_-=CD);
  U1.55(DO-.55=Q) = FD2SA(WAIT-=TE,DO-.55=TI,CP-=CP,U2.DO-.55=D,
          BRESET_-=CD);
  U1.54(DO-.54=Q) = FD2SA(WAIT-=TE,DO-.54=TI,CP-=CP,U2.DO-.54=D,
          BRESET_-=CD);
  U1.53(DO-.53=Q) = FD2SA(WAIT-=TE,DO-.53=TI,CP-=CP,U2.DO-.53=D,
          BRESET_-=CD);
  U1.52(DO-.52=Q) = FD2SA(WAIT-=TE,DO-.52=TI,CP-=CP,U2.DO-.52=D,
          BRESET_-=CD);
  U1.51(DO-.51=Q) = FD2SA(WAIT-=TE,DO-.51=TI,CP-=CP,U2.DO-.51=D,
          BRESET_-=CD);
  U1.50(DO-.50=Q) = FD2SA(WAIT-=TE,DO-.50=TI,CP-=CP,U2.DO-.50=D,
          BRESET_-=CD);
  U1.49(DO-.49=Q) = FD2SA(WAIT-=TE,DO-.49=TI,CP-=CP,U2.DO-.49=D,
          BRESET_-=CD);
  U1.48(DO-.48=Q) = FD2SA(WAIT-=TE,DO-.48=TI,CP-=CP,U2.DO-.48=D,
          BRESET_-=CD);
  U1.47(DO-.47=Q) = FD2SA(WAIT-=TE,DO-.47=TI,CP-=CP,U2.DO-.47=D,
          BRESET_-=CD);
  U1.46(DO-.46=Q) = FD2SA(WAIT-=TE,DO-.46=TI,CP-=CP,U2.DO-.46=D,
          BRESET_-=CD);
  U1.45(DO-.45=Q) = FD2SA(WAIT-=TE,DO-.45=TI,CP-=CP,U2.DO-.45=D,
          BRESET_-=CD);
  U1.44(DO-.44=Q) = FD2SA(WAIT-=TE,DO-.44=TI,CP-=CP,U2.DO-.44=D,
          BRESET_-=CD);
  U1.43(DO-.43=Q) = FD2SA(WAIT-=TE,DO-.43=TI,CP-=CP,U2.DO-.43=D,
          BRESET_-=CD);
  U1.42(DO-.42=Q) = FD2SA(WAIT-=TE,DO-.42=TI,CP-=CP,U2.DO-.42=D,
          BRESET_-=CD);
  U1.41(DO-.41=Q) = FD2SA(WAIT-=TE,DO-.41=TI,CP-=CP,U2.DO-.41=D,
          BRESET_-=CD);
  U1.40(DO-.40=Q) = FD2SA(WAIT-=TE,DO-.40=TI,CP-=CP,U2.DO-.40=D,
          BRESET_-=CD);
  U1.39(DO-.39=Q) = FD2SA(WAIT-=TE,DO-.39=TI,CP-=CP,U2.DO-.39=D,
          BRESET_-=CD);
  U1.38(DO-.38=Q) = FD2SA(WAIT-=TE,DO-.38=TI,CP-=CP,U2.DO-.38=D,
          BRESET_-=CD);
  U1.37(DO-.37=Q) = FD2SA(WAIT-=TE,DO-.37=TI,CP-=CP,U2.DO-.37=D,
          BRESET_-=CD);
  U1.36(DO-.36=Q) = FD2SA(WAIT-=TE,DO-.36=TI,CP-=CP,U2.DO-.36=D,
          BRESET_-=CD);
  U1.35(DO-.35=Q) = FD2SA(WAIT-=TE,DO-.35=TI,CP-=CP,U2.DO-.35=D,
          BRESET_-=CD);
  U1.34(DO-.34=Q) = FD2SA(WAIT-=TE,DO-.34=TI,CP-=CP,U2.DO-.34=D,
          BRESET_-=CD);
  U1.33(DO-.33=Q) = FD2SA(WAIT-=TE,DO-.33=TI,CP-=CP,U2.DO-.33=D,
          BRESET_-=CD);
  U1.32(DO-.32=Q) = FD2SA(WAIT-=TE,DO-.32=TI,CP-=CP,U2.DO-.32=D,
          BRESET_-=CD);
  U1.31(DO-.31=Q) = FD2SA(WAIT-=TE,DO-.31=TI,CP-=CP,U2.DO-.31=D,
          BRESET_-=CD);
  U1.30(DO-.30=Q) = FD2SA(WAIT-=TE,DO-.30=TI,CP-=CP,U2.DO-.30=D,
          BRESET_-=CD);
  U1.29(DO-.29=Q) = FD2SA(WAIT-=TE,DO-.29=TI,CP-=CP,U2.DO-.29=D,
          BRESET_-=CD);
```

```
U1.28(DO-.28=Q) = FD2SA(WAIT-=TE,DO-.28=TI,CP-=CP,U2.DO-.28=D,
        BRESET_-=CD);
U1.27(DO-.27=Q) = FD2SA(WAIT-=TE,DO-.27=TI,CP-=CP,U2.DO-.27=D,
        BRESET_-=CD);
U1.26(DO-.26=Q) = FD2SA(WAIT-=TE,DO-.26=TI,CP-=CP,U2.DO-.26=D,
        BRESET_-=CD);
U1.25(DO-.25=Q) = FD2SA(WAIT-=TE,DO-.25=TI,CP-=CP,U2.DO-.25=D,
        BRESET_-=CD);
U1.24(DO-.24=Q) = FD2SA(WAIT-=TE,DO-.24=TI,CP-=CP,U2.DO-.24=D,
        BRESET_-=CD);
U1.23(DO-.23=Q) = FD2SA(WAIT-=TE,DO-.23=TI,CP-=CP,U2.DO-.23=D,
        BRESET_-=CD);
U1.22(DO-.22=Q) = FD2SA(WAIT-=TE,DO-.22=TI,CP-=CP,U2.DO-.22=D,
        BRESET_-=CD);
U1.21(DO-.21=Q) = FD2SA(WAIT-=TE,DO-.21=TI,CP-=CP,U2.DO-.21=D,
        BRESET_-=CD);
U1.20(DO-.20=Q) = FD2SA(WAIT-=TE,DO-.20=TI,CP-=CP,U2.DO-.20=D,
        BRESET_-=CD);
U1.19(DO-.19=Q) = FD2SA(WAIT-=TE,DO-.19=TI,CP-=CP,U2.DO-.19=D,
        BRESET_-=CD);
U1.18(DO-.18=Q) = FD2SA(WAIT-=TE,DO-.18=TI,CP-=CP,U2.DO-.18=D,
        BRESET_-=CD);
U1.17(DO-.17=Q) = FD2SA(WAIT-=TE,DO-.17=TI,CP-=CP,U2.DO-.17=D,
        BRESET_-=CD);
U1.16(DO-.16=Q) = FD2SA(WAIT-=TE,DO-.16=TI,CP-=CP,U2.DO-.16=D,
        BRESET_-=CD);
U1.15(DO-.15=Q) = FD2SA(WAIT-=TE,DO-.15=TI,CP-=CP,U2.DO-.15=D,
        BRESET_-=CD);
U1.14(DO-.14=Q) = FD2SA(WAIT-=TE,DO-.14=TI,CP-=CP,U2.DO-.14=D,
        BRESET_-=CD);
U1.13(DO-.13=Q) = FD2SA(WAIT-=TE,DO-.13=TI,CP-=CP,U2.DO-.13=D,
        BRESET_-=CD);
U1.12(DO-.12=Q) = FD2SA(WAIT-=TE,DO-.12=TI,CP-=CP,U2.DO-.12=D,
        BRESET_-=CD);
U1.11(DO-.11=Q) = FD2SA(WAIT-=TE,DO-.11=TI,CP-=CP,U2.DO-.11=D,
        BRESET_-=CD);
U1.10(DO-.10=Q) = FD2SA(WAIT-=TE,DO-.10=TI,CP-=CP,U2.DO-.10=D,
        BRESET_-=CD);
U1.9(DO-.9=Q) = FD2SA(WAIT-=TE,DO-.9=TI,CP-=CP,U2.DO-.9=D,
        BRESET_-=CD);
U1.8(DO-.8=Q) = FD2SA(WAIT-=TE,DO-.8=TI,CP-=CP,U2.DO-.8=D,
        BRESET_-=CD);
U1.7(DO-.7=Q) = FD2SA(WAIT-=TE,DO-.7=TI,CP-=CP,U2.DO-.7=D,
        BRESET_-=CD);
U1.6(DO-.6=Q) = FD2SA(WAIT-=TE,DO-.6=TI,CP-=CP,U2.DO-.6=D,
        BRESET_-=CD);
U1.5(DO-.5=Q) = FD2SA(WAIT-=TE,DO-.5=TI,CP-=CP,U2.DO-.5=D,
        BRESET_-=CD);
U1.4(DO-.4=Q) = FD2SA(WAIT-=TE,DO-.4=TI,CP-=CP,U2.DO-.4=D,
        BRESET_-=CD);
U1.3(DO-.3=Q) = FD2SA(WAIT-=TE,DO-.3=TI,CP-=CP,U2.DO-.3=D,
        BRESET_-=CD);
U1.2(DO-.2=Q) = FD2SA(WAIT-=TE,DO-.2=TI,CP-=CP,U2.DO-.2=D,
        BRESET_-=CD);
U1.1(DO-.1=Q) = FD2SA(WAIT-=TE,DO-.1=TI,CP-=CP,U2.DO-.1=D,
        BRESET_-=CD);
U1.0(DO-.0=Q) = FD2SA(WAIT-=TE,DO-.0=TI,CP-=CP,U2.DO-.0=D,
        BRESET_-=CD);
U0(U0.Z-=Z) = OR2C(ALE-=A,CS_-=B);
U4(U4.Z-.3=Z.3,U4.Z-.2=Z.2,U4.Z-.1=Z.1,U4.Z-.0=Z.0) = MUX2X1W4(
        ADDR-.3=B.3,ADDR-.2=B.2,ADDR-.1=B.1,ADDR-.0=B.0,CS_-=S,
        U4.A-.3=A.3,U4.A-.2=A.2,U4.A-.1=A.1,U4.A-.0=A.0);
U2(U2.DO-.59=DO.59,U2.DO-.58=DO.58,U2.DO-.57=DO.57,U2.DO-.56=DO.56,
        U2.DO-.55=DO.55,U2.DO-.54=DO.54,U2.DO-.53=DO.53,
        U2.DO-.52=DO.52,U2.DO-.51=DO.51,U2.DO-.50=DO.50,
        U2.DO-.49=DO.49,U2.DO-.48=DO.48,U2.DO-.47=DO.47,
        U2.DO-.46=DO.46,U2.DO-.45=DO.45,U2.DO-.44=DO.44,
        U2.DO-.43=DO.43,U2.DO-.42=DO.42,U2.DO-.41=DO.41,
        U2.DO-.40=DO.40,U2.DO-.39=DO.39,U2.DO-.38=DO.38,
        U2.DO-.37=DO.37,U2.DO-.36=DO.36,U2.DO-.35=DO.35,
        U2.DO-.34=DO.34,U2.DO-.33=DO.33,U2.DO-.32=DO.32,
        U2.DO-.31=DO.31,U2.DO-.30=DO.30,U2.DO-.29=DO.29,
        U2.DO-.28=DO.28,U2.DO-.27=DO.27,U2.DO-.26=DO.26,
```

```
        U2.DO-.25=DO.25,U2.DO-.24=DO.24,U2.DO-.23=DO.23,
        U2.DO-.22=DO.22,U2.DO-.21=DO.21,U2.DO-.20=DO.20,
        U2.DO-.19=DO.19,U2.DO-.18=DO.18,U2.DO-.17=DO.17,
        U2.DO-.16=DO.16,U2.DO-.15=DO.15,U2.DO-.14=DO.14,
        U2.DO-.13=DO.13,U2.DO-.12=DO.12,U2.DO-.11=DO.11,
        U2.DO-.10=DO.10,U2.DO-.9=DO.9,U2.DO-.8=DO.8,U2.DO-.7=DO.7,
        U2.DO-.6=DO.6,U2.DO-.5=DO.5,U2.DO-.4=DO.4,U2.DO-.3=DO.3,
        U2.DO-.2=DO.2,U2.DO-.1=DO.1,U2.DO-.0=DO.0,PDO1-.11=PDO.11,
        PDO1-.10=PDO.10,PDO1-.9=PDO.9,PDO1-.8=PDO.8,PDO1-.7=PDO.7,
        PDO1-.6=PDO.6,PDO1-.5=PDO.5,PDO1-.4=PDO.4,PDO1-.3=PDO.3,
        PDO1-.2=PDO.2,PDO1-.1=PDO.1,PDO1-.0=PDO.0) = MEM16X60(
        U0.Z-=ALE,U4.Z-.3=ADR.3,U4.Z-.2=ADR.2,U4.Z-.1=ADR.1,
        U4.Z-.0=ADR.0,PDI-.11=DI.11,PDI-.10=DI.10,PDI-.9=DI.9,
        PDI-.8=DI.8,PDI-.7=DI.7,PDI-.6=DI.6,PDI-.5=DI.5,
        PDI-.4=DI.4,PDI-.3=DI.3,PDI-.2=DI.2,PDI-.1=DI.1,
        PDI-.0=DI.0,U3.W4E-=W4E,U3.W3E-=W3E,U3.W2E-=W2E,
        U3.W1E-=W1E,U3.W0E-=W0E,U3.WE-=WE);
  U3(U3.W4E-=W4E,U3.W3E-=W3E,U3.W2E-=W2E,U3.W1E-=W1E,U3.W0E-=W0E,
        U3.WE-=WE) = CMEMDECV1(U3.PA2-=PA2,U3.PA1-=PA1,U3.PA0-=PA0,
        WR_-=WR_,TST-=OPR,CS_-=CS_);

 /* extractors ******************************/

  PA-.2 = (U3.PA2-);
  PA-.1 = (U3.PA1-);
  PA-.6 = (U4.A-.3);
  PA-.5 = (U4.A-.2);
  PA-.4 = (U4.A-.1);
  PA-.3 = (U4.A-.0);
  PA-.0 = (U3.PA0-);

 /* type converters *********************/

ANNOTATIONS
{
 BUS BUS_TYPE = "DOT";
}

END MODULE;


/* * * * * * *  Contents of NET file CNV_V4.NET  * * * * * * */

/*****************************************************/
/*  Netlist copyright (C) 1989 LSI Logic Corporation  */
/*****************************************************/


MODULE CNV_V4;

INPUTS      ALE,CLRXAU,CLRYAU,CMAGEN,CMEM_CS_,COF_ADRIN.2,
            COF_ADRIN.1,COF_ADRIN.0,CP,DUP,ENXAU,ENYAU,EOC,
            FRSTROW,INT_GT_1IN,LIM,LSTROW,LSTROW_1,LS_1,MR_CS_,
            NOS.1,NOS.0,PA.6,PA.5,PA.4,PA.3,PA.2,PA.1,PA.0,PDI.15,
            PDI.14,PDI.13,PDI.12,PDI.11,PDI.10,PDI.9,PDI.8,PDI.7,
            PDI.6,PDI.5,PDI.4,PDI.3,PDI.2,PDI.1,PDI.0,PLR_CS_,PSE,
            PXL_EN,RC0.7,RC0.6,RC0.5,RC0.4,RC0.3,RC0.2,RC0.1,
            RC0.0,RC1.7,RC1.6,RC1.5,RC1.4,RC1.3,RC1.2,RC1.1,RC1.0,
            RC2.7,RC2.6,RC2.5,RC2.4,RC2.3,RC2.2,RC2.1,RC2.0,RC3.7,
            RC3.6,RC3.5,RC3.4,RC3.3,RC3.2,RC3.1,RC3.0,RC4.7,RC4.6,
            RC4.5,RC4.4,RC4.3,RC4.2,RC4.1,RC4.0,RESET_,S,SCNDCOL,
            SCNDROW,SE,SEL00,SEL01,SEL10,SEL11,SPR.1,SPR.0,SPRCYC,
            STB_I,TST,WAIT,WR_,XAU_HCS_,XAU_LCS_,XSCNIN,YADRSEL,
            YAU_HCS_,YAU_LCS_,YDWN,YINCEN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
            CNVL.4,CNVL.3,CNVL.2,CNVL.1,CNVL.0,DLY_POL,EOR,INCY,
            PDO.15,PDO.14,PDO.13,PDO.12,PDO.11,PDO.10,PDO.9,PDO.8,
            PDO.7,PDO.6,PDO.5,PDO.4,PDO.3,PDO.2,PDO.1,PDO.0,
            S_MODE,XINT_GT_1,YINT,YINTSND;
```

```
LEVEL FUNCTION;
DEFINE
  /* implicit connectors *******************/

    LIM- = (LIM);
    LS_1- = (LS_1);
    YINT- = (YINT);
    EOR- = (EOR);
    YINTSND- = (YINTSND);
    YAU_LCS_- = (YAU_LCS_);
    YAU_HCS_- = (YAU_HCS_);
    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    YDWN- = (YDWN);
    YUP- = (YUP);
    COF_ADRIN-.2 = (COF_ADRIN.2);
    COF_ADRIN-.1 = (COF_ADRIN.1);
    COF_ADRIN-.0 = (COF_ADRIN.0);
    XAU_HCS_- = (XAU_HCS_);
    XAU_LCS_- = (XAU_LCS_);
    XSCNIN- = (XSCNIN);
    CLRXCNT_- = (CLRXCNT_);
    BRESET_- = (BRESET_);
    RESET_- = (RESET_);
    BRESET_- = (BRESET_);
    SCNDCOL- = (SCNDCOL);
    PSE- = (PSE);
    MR_CS_- = (MR_CS_);
    WR_- = (WR_);
    WR_- = (WR_);
    S_MODE- = (S_MODE);
    SEL10- = (SEL10);
    SEL11- = (SEL11);
    ROW_ORDER-.2 = (ROW_ORDER.2);
    ROW_ORDER-.1 = (ROW_ORDER.1);
    ROW_ORDER-.0 = (ROW_ORDER.0);
    ROW_ORDER-.2 = (ROW_ORDER.2);
    ROW_ORDER-.1 = (ROW_ORDER.1);
    ROW_ORDER-.0 = (ROW_ORDER.0);
    BRESET_- = (BRESET_);
    RC4-.7 = (RC4.7);
    RC4-.6 = (RC4.6);
    RC4-.5 = (RC4.5);
    RC4-.4 = (RC4.4);
    RC4-.3 = (RC4.3);
    RC4-.2 = (RC4.2);
    RC4-.1 = (RC4.1);
    RC4-.0 = (RC4.0);
    RC3-.7 = (RC3.7);
    RC3-.6 = (RC3.6);
    RC3-.5 = (RC3.5);
    RC3-.4 = (RC3.4);
    RC3-.3 = (RC3.3);
    RC3-.2 = (RC3.2);
    RC3-.1 = (RC3.1);
    RC3-.0 = (RC3.0);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC1-.7 = (RC1.7);
    RC1-.6 = (RC1.6);
    RC1-.5 = (RC1.5);
    RC1-.4 = (RC1.4);
    RC1-.3 = (RC1.3);
    RC1-.2 = (RC1.2);
```

```
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
STB_I- = (STB_I);
S- = (S);
LSTROW- = (LSTROW);
LSTROW- = (LSTROW);
LSTROW- = (LSTROW);
LSTROW_1- = (LSTROW_1);
LSTROW_1- = (LSTROW_1);
LSTROW_1- = (LSTROW_1);
SCNDROW- = (SCNDROW);
SCNDROW- = (SCNDROW);
SCNDROW- = (SCNDROW);
FRSTROW- = (FRSTROW);
FRSTROW- = (FRSTROW);
FRSTROW- = (FRSTROW);
SE- = (SE);
SE- = (SE);
DUP- = (DUP);
DUP- = (DUP);
P1_BUSY- = (P1_BUSY);
P1_BUSY- = (P1_BUSY);
P1_BUSY- = (P1_BUSY);
INCY- = (INCY);
INCY- = (INCY);
YINCEN- = (YINCEN);
YINCEN- = (YINCEN);
ENYAU- = (ENYAU);
ENYAU- = (ENYAU);
CLRYAU- = (CLRYAU);
CLRYAU- = (CLRYAU);
ENXAU- = (ENXAU);
MR-.4 = (MR.4);
MR-.3 = (MR.3);
MR-.2 = (MR.2);
MR-.1 = (MR.1);
MR-.0 = (MR.0);
INT_GT_1IN- = (INT_GT_1IN);
INT_GT_1IN- = (INT_GT_1IN);
XINT_GT_1- = (XINT_GT_1);
XINT_GT_1- = (XINT_GT_1);
CMAGEN- = (CMAGEN);
PXL_EN- = (PXL_EN);
PXL_EN- = (PXL_EN);
NOS-.1 = (NOS.1);
NOS-.0 = (NOS.0);
NOS-.1 = (NOS.1);
NOS-.0 = (NOS.0);
DLY_POL- = (DLY_POL);
DLY_POL- = (DLY_POL);
SPRCYC- = (SPRCYC);
SPRCYC- = (SPRCYC);
YADRSEL- = (YADRSEL);
EOC- = (EOC);
EOC- = (EOC);
CP- = (CP);
CP- = (CP);
CP- = (CP);
CP- = (CP);
BRESET_- = (BRESET_);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
```

```
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
```

```
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PA-.6 = (PA.6);
PA-.5 = (PA.5);
PA-.4 = (PA.4);
PA-.3 = (PA.3);
PA-.2 = (PA.2);
PA-.1 = (PA.1);
PA-.0 = (PA.0);
WR_- = (WR_);
CMEM_CS_- = (CMEM_CS_);
ALE- = (ALE);
TST- = (TST);
TST- = (TST);
TST- = (TST);
TST- = (TST);
BWAIT1- = (BWAIT1);
BWAIT0- = (BWAIT0);
BWAIT0- = (BWAIT0);
BWAIT0- = (BWAIT0);
WAIT- = (WAIT);
CP- = (CP);
BRESET_- = (BRESET_);
BWAIT1- = (BWAIT1);
BWAIT1- = (BWAIT1);
CP- = (CP);
CP- = (CP);
BRESET_- = (BRESET_);
ENXAU- = (ENXAU);
ENXAU- = (ENXAU);
CLRXAU- = (CLRXAU);
CLRXAU- = (CLRXAU);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
SEL00- = (SEL00);
```

```
SEL01- = (SEL01);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
SPR-.1 = (SPR.1);
SPR-.0 = (SPR.0);
SPR-.1 = (SPR.1);
SPR-.0 = (SPR.0);
PLR_CS_- = (PLR_CS_);
WR_- = (WR_);
WR_- = (WR_);
BRESET_- = (BRESET_);
MR-.4 = (MR.4);
MR-.3 = (MR.3);
MR-.2 = (MR.2);
MR-.1 = (MR.1);
MR-.0 = (MR.0);
S_MODE- = (S_MODE);
```

```
S_MODE- = (S_MODE);
BRESET_- = (BRESET_);
BRESET_- = (BRESET_);
MR-.4 = (MR.4);
MR-.3 = (MR.3);
MR-.2 = (MR.2);
MR-.1 = (MR.1);
MR-.0 = (MR.0);
MR-.4 = (MR.4);
MR-.3 = (MR.3);
MR-.2 = (MR.2);
MR-.1 = (MR.1);
MR-.0 = (MR.0);
YSCNIN- = (YSCNIN);


/* part instances ***************************/

U7(BRESET_-=Z) = B3A(RESET_-=A);
U6(U6.Q-=Q) = FD2A(WAIT-=D,CP-=CP,BRESET_-=CD);
U8.1(U8.Z-.1=Z) = B3A(U6.Q-=A);
U8.0(U8.Z-.0=Z) = B3A(U6.Q-=A);
U4(PDO1-.11=PDO1.11,PDO1-.10=PDO1.10,PDO1-.9=PDO1.9,PDO1-.8=PDO1.8,
      PDO1-.7=PDO1.7,PDO1-.6=PDO1.6,PDO1-.5=PDO1.5,PDO1-.4=PDO1.4,
      PDO1-.3=PDO1.3,PDO1-.2=PDO1.2,PDO1-.1=PDO1.1,PDO1-.0=PDO1.0,
      U4.DO-.59=DO.59,U4.DO-.58=DO.58,U4.DO-.57=DO.57,
      U4.DO-.56=DO.56,U4.DO-.55=DO.55,U4.DO-.54=DO.54,
      U4.DO-.53=DO.53,U4.DO-.52=DO.52,U4.DO-.51=DO.51,
      U4.DO-.50=DO.50,U4.DO-.49=DO.49,U4.DO-.48=DO.48,
      U4.DO-.47=DO.47,U4.DO-.46=DO.46,U4.DO-.45=DO.45,
      U4.DO-.44=DO.44,U4.DO-.43=DO.43,U4.DO-.42=DO.42,
      U4.DO-.41=DO.41,U4.DO-.40=DO.40,U4.DO-.39=DO.39,
      U4.DO-.38=DO.38,U4.DO-.37=DO.37,U4.DO-.36=DO.36,
      U4.DO-.35=DO.35,U4.DO-.34=DO.34,U4.DO-.33=DO.33,
      U4.DO-.32=DO.32,U4.DO-.31=DO.31,U4.DO-.30=DO.30,
      U4.DO-.29=DO.29,U4.DO-.28=DO.28,U4.DO-.27=DO.27,
      U4.DO-.26=DO.26,U4.DO-.25=DO.25,U4.DO-.24=DO.24,
      U4.DO-.23=DO.23,U4.DO-.22=DO.22,U4.DO-.21=DO.21,
      U4.DO-.20=DO.20,U4.DO-.19=DO.19,U4.DO-.18=DO.18,
      U4.DO-.17=DO.17,U4.DO-.16=DO.16,U4.DO-.15=DO.15,
      U4.DO-.14=DO.14,U4.DO-.13=DO.13,U4.DO-.12=DO.12,
      U4.DO-.11=DO.11,U4.DO-.10=DO.10,U4.DO-.9=DO.9,
      U4.DO-.8=DO.8,U4.DO-.7=DO.7,U4.DO-.6=DO.6,U4.DO-.5=DO.5,
      U4.DO-.4=DO.4,U4.DO-.3=DO.3,U4.DO-.2=DO.2,U4.DO-.1=DO.1,
      U4.DO-.0=DO.0) = CMEM(U1.COF_ADR-.3=ADDR.3,
      U1.COF_ADR-.2=ADDR.2,U1.COF_ADR-.1=ADDR.1,
      U1.COF_ADR-.0=ADDR.0,BRESET_-=RESET_,CP-=CP,
      U4.PDI-.11=PDI.11,U4.PDI-.10=PDI.10,U4.PDI-.9=PDI.9,
      U4.PDI-.8=PDI.8,U4.PDI-.7=PDI.7,U4.PDI-.6=PDI.6,
      U4.PDI-.5=PDI.5,U4.PDI-.4=PDI.4,U4.PDI-.3=PDI.3,
      U4.PDI-.2=PDI.2,U4.PDI-.1=PDI.1,U4.PDI-.0=PDI.0,PA-.6=PA.6,
      PA-.5=PA.5,PA-.4=PA.4,PA-.3=PA.3,PA-.2=PA.2,PA-.1=PA.1,
      PA-.0=PA.0,WR_-=WR_,CMEM_CS_-=CS_,ALE-=ALE,TST-=TST,
      BWAIT1-=WAIT);
U1(U1.COF_ADR-.3=COF_ADR.3,U1.COF_ADR-.2=COF_ADR.2,
      U1.COF_ADR-.1=COF_ADR.1,U1.COF_ADR-.0=COF_ADR.0) =
      CMAGV2(U1.S_MODE-=S_MODE,U3.COF_ADR-.2=YCOF_ADR.2,
      U3.COF_ADR-.1=YCOF_ADR.1,U3.COF_ADR-.0=YCOF_ADR.0,
      U5.COF_ADR-.2=XCOF_ADR.2,U5.COF_ADR-.1=XCOF_ADR.1,
      U5.COF_ADR-.0=XCOF_ADR.0,INT_GT_1IN-=INT_GT_1IN,
      XINT_GT_1-=XGT1,CMAGEN-=CMAGEN,PXL_EN-=PXL_EN,NOS-.1=NOS.1,
      NOS-.0=NOS.0,DLY_POL-=DLY_POL,SPRCYC-=SPRCYC,YADRSEL-=YCOF_SEL,
      ENXAU-=ENXAU,EOC-=EOC,BWAIT1-=WAIT,CP-=CP,BRESET_-=RESET_);
U9(PDO-.15=PDO.15,PDO-.14=PDO.14,PDO-.13=PDO.13,PDO-.12=PDO.12,
      PDO-.11=PDO.11,PDO-.10=PDO.10,PDO-.9=PDO.9,PDO-.8=PDO.8,
      PDO-.7=PDO.7,PDO-.6=PDO.6,PDO-.5=PDO.5,PDO-.4=PDO.4,
      PDO-.3=PDO.3,PDO-.2=PDO.2,PDO-.1=PDO.1,PDO-.0=PDO.0)
       = PDMX1(PDO1-.11=PDO1.11,PDO1-.10=PDO1.10,PDO1-.9=PDO1.9,
      PDO1-.8=PDO1.8,PDO1-.7=PDO1.7,PDO1-.6=PDO1.6,PDO1-.5=PDO1.5,
      PDO1-.4=PDO1.4,PDO1-.3=PDO1.3,PDO1-.2=PDO1.2,PDO1-.1=PDO1.1,
      PDO1-.0=PDO1.0,SPR-.1=SPR.1,SPR-.0=SPR.0,LSTROW-=LSTROW,
      LSTROW_1-=LSTROW_1,SCNDROW-=SCNDROW,FRSTROW-=FRSTROW,
      SE-=SE,DUP-=DUP,P1_BUSY-=YINT_GT_1,INCY-=INCY,YINCEN-=YINCEN,
```

```
        ENYAU-=EENYAU,CLRYAU-=CLRYAU,XINT_GT_1-=XINT_GT_1,
        ENXAU-=ENXAU,CLRXAU-=CLRXAU,SEL00-=SEL00,SEL01-=SEL01,
        PDO2-.15=PD2.15,PDO2-.14=PD2.14,PDO2-.13=PD2.13,
        PDO2-.12=PD2.12,PDO2-.11=PD2.11,PDO2-.10=PD2.10,
        PDO2-.9=PD2.9,PDO2-.8=PD2.8,PDO2-.7=PD2.7,PDO2-.6=PD2.6,
        PDO2-.5=PD2.5,PDO2-.4=PD2.4,PDO2-.3=PD2.3,PDO2-.2=PD2.2,
        PDO2-.1=PD2.1,PDO2-.0=PD2.0,CNVL-.12=CNVL.12,CNVL-.11=CNVL.11,
        CNVL-.10=CNVL.10,CNVL-.9=CNVL.9,CNVL-.8=CNVL.8,
        CNVL-.7=CNVL.7,CNVL-.6=CNVL.6,CNVL-.5=CNVL.5,CNVL-.4=CNVL.4,
        CNVL-.3=CNVL.3,CNVL-.2=CNVL.2,CNVL-.1=CNVL.1,CNVL-.0=CNVL.0);
U0(CNVL-.12=CNVL.12,CNVL-.11=CNVL.11,CNVL-.10=CNVL.10,CNVL-.9=CNVL.9,
        CNVL-.8=CNVL.8,CNVL-.7=CNVL.7,CNVL-.6=CNVL.6,CNVL-.5=CNVL.5,
        CNVL-.4=CNVL.4,CNVL-.3=CNVL.3,CNVL-.2=CNVL.2,CNVL-.1=CNVL.1,
        CNVL-.0=CNVL.0,PDO2-.15=PDO2.15,PDO2-.14=PDO2.14,
        PDO2-.13=PDO2.13,PDO2-.12=PDO2.12,PDO2-.11=PDO2.11,
        PDO2-.10=PDO2.10,PDO2-.9=PDO2.9,PDO2-.8=PDO2.8,
        PDO2-.7=PDO2.7,PDO2-.6=PDO2.6,PDO2-.5=PDO2.5,PDO2-.4=PDO2.4,
        PDO2-.3=PDO2.3,PDO2-.2=PDO2.2,PDO2-.1=PDO2.1,PDO2-.0=PDO2.0)
         = ENGN_V3(S_MODE-=S_MODE,SEL10-=SEL10,SEL11-=SEL11,
        ROW_ORDER-.2=ROW_ORDR.2,ROW_ORDER-.1=ROW_ORDR.1,
        ROW_ORDER-.0=ROW_ORDR.0,NOS-.1=NOS.1,NOS-.0=NOS.0,
        BRESET_-=RESET_,U0.PDI-.12=PDI.12,U0.PDI-.11=PDI.11,
        U0.PDI-.10=PDI.10,U0.PDI-.9=PDI.9,U0.PDI-.8=PDI.8,
        U0.PDI-.7=PDI.7,U0.PDI-.6=PDI.6,U0.PDI-.5=PDI.5,
        U0.PDI-.4=PDI.4,U0.PDI-.3=PDI.3,U0.PDI-.2=PDI.2,
        U0.PDI-.1=PDI.1,U0.PDI-.0=PDI.0,CP-=CP,TST-=TST,
        U0.CD4-.11=CD4.11,U0.CD4-.10=CD4.10,U0.CD4-.9=CD4.9,
        U0.CD4-.8=CD4.8,U0.CD4-.7=CD4.7,U0.CD4-.6=CD4.6,
        U0.CD4-.5=CD4.5,U0.CD4-.4=CD4.4,U0.CD4-.3=CD4.3,
        U0.CD4-.2=CD4.2,U0.CD4-.1=CD4.1,U0.CD4-.0=CD4.0,
        U0.CD3-.11=CD3.11,U0.CD3-.10=CD3.10,U0.CD3-.9=CD3.9,
        U0.CD3-.8=CD3.8,U0.CD3-.7=CD3.7,U0.CD3-.6=CD3.6,
        U0.CD3-.5=CD3.5,U0.CD3-.4=CD3.4,U0.CD3-.3=CD3.3,
        U0.CD3-.2=CD3.2,U0.CD3-.1=CD3.1,U0.CD3-.0=CD3.0,
        U0.CD2-.11=CD2.11,U0.CD2-.10=CD2.10,U0.CD2-.9=CD2.9,
        U0.CD2-.8=CD2.8,U0.CD2-.7=CD2.7,U0.CD2-.6=CD2.6,
        U0.CD2-.5=CD2.5,U0.CD2-.4=CD2.4,U0.CD2-.3=CD2.3,
        U0.CD2-.2=CD2.2,U0.CD2-.1=CD2.1,U0.CD2-.0=CD2.0,
        U0.CD1-.11=CD1.11,U0.CD1-.10=CD1.10,U0.CD1-.9=CD1.9,
        U0.CD1-.8=CD1.8,U0.CD1-.7=CD1.7,U0.CD1-.6=CD1.6,
        U0.CD1-.5=CD1.5,U0.CD1-.4=CD1.4,U0.CD1-.3=CD1.3,
        U0.CD1-.2=CD1.2,U0.CD1-.1=CD1.1,U0.CD1-.0=CD1.0,
        U0.CD0-.11=CD0.11,U0.CD0-.10=CD0.10,U0.CD0-.9=CD0.9,
        U0.CD0-.8=CD0.8,U0.CD0-.7=CD0.7,U0.CD0-.6=CD0.6,
        U0.CD0-.5=CD0.5,U0.CD0-.4=CD0.4,U0.CD0-.3=CD0.3,
        U0.CD0-.2=CD0.2,U0.CD0-.1=CD0.1,U0.CD0-.0=CD0.0,
        DLY_POL-=DLY_POL,RC4-.7=RC4.7,RC4-.6=RC4.6,RC4-.5=RC4.5,
        RC4-.4=RC4.4,RC4-.3=RC4.3,RC4-.2=RC4.2,RC4-.1=RC4.1,
        RC4-.0=RC4.0,RC3-.7=RC3.7,RC3-.6=RC3.6,RC3-.5=RC3.5,
        RC3-.4=RC3.4,RC3-.3=RC3.3,RC3-.2=RC3.2,RC3-.1=RC3.1,
        RC3-.0=RC3.0,RC2-.7=RC2.7,RC2-.6=RC2.6,RC2-.5=RC2.5,
        RC2-.4=RC2.4,RC2-.3=RC2.3,RC2-.2=RC2.2,RC2-.1=RC2.1,
        RC2-.0=RC2.0,RC1-.7=RC1.7,RC1-.6=RC1.6,RC1-.5=RC1.5,
        RC1-.4=RC1.4,RC1-.3=RC1.3,RC1-.2=RC1.2,RC1-.1=RC1.1,
        RC1-.0=RC1.0,RC0-.7=RC0.7,RC0-.6=RC0.6,RC0-.5=RC0.5,
        RC0-.4=RC0.4,RC0-.3=RC0.3,RC0-.2=RC0.2,RC0-.1=RC0.1,
        RC0-.0=RC0.0,STB_I-=STB_I,DUP-=DUP,SE-=SE,BWAIT0-=WAIT,
        S-=S,FRSTROW-=FRST_ROW,SCNDROW-=SCND_ROW,LSTROW_1-=LST_ROW_1,
        LSTROW-=LST_ROW,SPR-.1=SPR.1,SPR-.0=SPR.0,PLR_CS_-=PLR_CS_,
        WR_-=WR_);
U10(MR-.4=Q.4,MR-.3=Q.3,MR-.2=Q.2,MR-.1=Q.1,MR-.0=Q.0) = MR5(
        U10.D-.4=D.4,U10.D-.3=D.3,U10.D-.2=D.2,U10.D-.1=D.1,
        U10.D-.0=D.0,MR_CS_-=CS_,WR_-=WR_,BRESET_-=RESET_);
U2(DLY_POL-=DLY_POL) = PSDV2FN(P1_BUSY-=P1_BUSY,CP-=CP,BRESET_-=RESET_,
        SCNDCOL-=SC,PSE-=SE,EOC-=EOC,S_MODE-=S_MODE);
U5(U5.COF_ADR-.2=COF_ADR.2,U5.COF_ADR-.1=COF_ADR.1,
        U5.COF_ADR-.0=COF_ADR.0,XINT_GT_1-=INT_GT_1,P1_BUSY-=P1_BUSY,
        CLRXCNT_-=CLRXCNT_) = XAUV2(PXL_EN-=PIX_EN,COF_ADRIN-.2=COF_ADRIN.2,
        COF_ADRIN-.1=COF_ADRIN.1,COF_ADRIN-.0=COF_ADRIN.0,
        INT_GT_1IN-=INT_GT_1IN,U5.S_MODE-=S_MODE,PDI-.15=PDI.15,
        PDI-.14=PDI.14,PDI-.13=PDI.13,PDI-.12=PDI.12,PDI-.11=PDI.11,
        PDI-.10=PDI.10,PDI-.9=PDI.9,PDI-.8=PDI.8,PDI-.7=PDI.7,
```

```
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,XAU_HCS_-=DH_CS_,
        XAU_LCS_-=DL_CS_,WR_-=WR_,SPRCYC-=SPRCYC,ENXAU-=ENAU,
        CLRXAU-=CLRAU,CP-=CP,BWAIT0-=WAIT,XSCNIN-=SCNIN,TST-=TEST,
        BRESET_-=RESET_);
 U3(U3.COF_ADR-.2=COF_ADR.2,U3.COF_ADR-.1=COF_ADR.1,
        U3.COF_ADR-.0=COF_ADR.0,ROW_ORDER-.2=ROW_ORDER.2,
        ROW_ORDER-.1=ROW_ORDER.1,ROW_ORDER-.0=ROW_ORDER.0,
        YINT-=YINT,EOR-=EOR,YINTSND-=YINTSND,INCY-=INCY,
        BMYL-.4=BMYL.4,BMYL-.3=BMYL.3,BMYL-.2=BMYL.2,BMYL-.1=BMYL.1,
        BMYL-.0=BMYL.0) = YAUV2(LIM-=LIM,LS_1-=LS_1,BRESET_-=RESET_,
        TST-=TEST,YSCNIN-=SCNIN,CP-=CP,CLRYAU-=CLRYAU,ENYAU-=ENYAU,
        YINCEN-=YINCEN,LSTROW-=LSTROW,LSTROW_1-=LSTROW_1,
        SCNDROW-=SCNDROW,FRSTROW-=FRSTROW,WR_-=WR_,YAU_LCS_-=DL_CS_,
        YAU_HCS_-=DH_CS_,PDI-.15=PDI.15,PDI-.14=PDI.14,
        PDI-.13=PDI.13,PDI-.12=PDI.12,PDI-.11=PDI.11,PDI-.10=PDI.10,
        PDI-.9=PDI.9,PDI-.8=PDI.8,PDI-.7=PDI.7,PDI-.6=PDI.6,
        PDI-.5=PDI.5,PDI-.4=PDI.4,PDI-.3=PDI.3,PDI-.2=PDI.2,
        PDI-.1=PDI.1,PDI-.0=PDI.0,U3.S_MODE-=S_MODE,U3.NOL-.2=NOL.2,
        U3.NOL-.1=NOL.1,U3.NOL-.0=NOL.0,YDWN-=YDWN,YUP-=YUP,
        U3.RND_EN-=RND_EN);


/* extractors ******************************/

 MR-.3 = (U1.S_MODE-);
 U4.DO-.23 = (U0.CD1-.11);
 U4.DO-.22 = (U0.CD1-.10);
 U4.DO-.21 = (U0.CD1-.9);
 U4.DO-.20 = (U0.CD1-.8);
 U4.DO-.19 = (U0.CD1-.7);
 U4.DO-.18 = (U0.CD1-.6);
 U4.DO-.17 = (U0.CD1-.5);
 U4.DO-.16 = (U0.CD1-.4);
 U4.DO-.15 = (U0.CD1-.3);
 U4.DO-.14 = (U0.CD1-.2);
 U4.DO-.13 = (U0.CD1-.1);
 U4.DO-.12 = (U0.CD1-.0);
 U4.DO-.47 = (U0.CD3-.11);
 U4.DO-.46 = (U0.CD3-.10);
 U4.DO-.45 = (U0.CD3-.9);
 U4.DO-.44 = (U0.CD3-.8);
 U4.DO-.43 = (U0.CD3-.7);
 U4.DO-.42 = (U0.CD3-.6);
 U4.DO-.41 = (U0.CD3-.5);
 U4.DO-.40 = (U0.CD3-.4);
 U4.DO-.39 = (U0.CD3-.3);
 U4.DO-.38 = (U0.CD3-.2);
 U4.DO-.37 = (U0.CD3-.1);
 U4.DO-.36 = (U0.CD3-.0);
 U4.DO-.11 = (U0.CD0-.11);
 U4.DO-.10 = (U0.CD0-.10);
 U4.DO-.9 = (U0.CD0-.9);
 U4.DO-.8 = (U0.CD0-.8);
 U4.DO-.7 = (U0.CD0-.7);
 U4.DO-.6 = (U0.CD0-.6);
 U4.DO-.5 = (U0.CD0-.5);
 U4.DO-.4 = (U0.CD0-.4);
 U4.DO-.3 = (U0.CD0-.3);
 U4.DO-.2 = (U0.CD0-.2);
 U4.DO-.1 = (U0.CD0-.1);
 U4.DO-.0 = (U0.CD0-.0);
 U4.DO-.35 = (U0.CD2-.11);
 U4.DO-.34 = (U0.CD2-.10);
 U4.DO-.33 = (U0.CD2-.9);
 U4.DO-.32 = (U0.CD2-.8);
 U4.DO-.31 = (U0.CD2-.7);
 U4.DO-.30 = (U0.CD2-.6);
 U4.DO-.29 = (U0.CD2-.5);
 U4.DO-.28 = (U0.CD2-.4);
 U4.DO-.27 = (U0.CD2-.3);
 U4.DO-.26 = (U0.CD2-.2);
 U4.DO-.25 = (U0.CD2-.1);
```

```
    U4.DO-.24 = (U0.CD2-.0);
    U4.DO-.59 = (U0.CD4-.11);
    U4.DO-.58 = (U0.CD4-.10);
    U4.DO-.57 = (U0.CD4-.9);
    U4.DO-.56 = (U0.CD4-.8);
    U4.DO-.55 = (U0.CD4-.7);
    U4.DO-.54 = (U0.CD4-.6);
    U4.DO-.53 = (U0.CD4-.5);
    U4.DO-.52 = (U0.CD4-.4);
    U4.DO-.51 = (U0.CD4-.3);
    U4.DO-.50 = (U0.CD4-.2);
    U4.DO-.49 = (U0.CD4-.1);
    U4.DO-.48 = (U0.CD4-.0);
    PDI-.12 = (U0.PDI-.12);
    PDI-.11 = (U0.PDI-.11);
    PDI-.10 = (U0.PDI-.10);
    PDI-.9 = (U0.PDI-.9);
    PDI-.8 = (U0.PDI-.8);
    PDI-.7 = (U0.PDI-.7);
    PDI-.6 = (U0.PDI-.6);
    PDI-.5 = (U0.PDI-.5);
    PDI-.4 = (U0.PDI-.4);
    PDI-.3 = (U0.PDI-.3);
    PDI-.2 = (U0.PDI-.2);
    PDI-.1 = (U0.PDI-.1);
    PDI-.0 = (U0.PDI-.0);
    PDI-.10 = (U10.D-.4);
    PDI-.9 = (U10.D-.3);
    PDI-.8 = (U10.D-.2);
    PDI-.7 = (U10.D-.1);
    PDI-.6 = (U10.D-.0);
    PDI-.11 = (U4.PDI-.11);
    PDI-.10 = (U4.PDI-.10);
    PDI-.9 = (U4.PDI-.9);
    PDI-.8 = (U4.PDI-.8);
    PDI-.7 = (U4.PDI-.7);
    PDI-.6 = (U4.PDI-.6);
    PDI-.5 = (U4.PDI-.5);
    PDI-.4 = (U4.PDI-.4);
    PDI-.3 = (U4.PDI-.3);
    PDI-.2 = (U4.PDI-.2);
    PDI-.1 = (U4.PDI-.1);
    PDI-.0 = (U4.PDI-.0);
    U8.Z-.0 = (BWAIT0-);
    U8.Z-.1 = (BWAIT1-);
    MR-.3 = (S_MODE-);
    MR-.3 = (U5.S_MODE-);
    MR-.3 = (U3.S_MODE-);
    MR-.2 = (U3.NOL-.2);
    MR-.1 = (U3.NOL-.1);
    MR-.0 = (U3.NOL-.0);
    MR-.4 = (U3.RND_EN-);

  /* type converters *********************/

ANNOTATIONS
{
  BUS BUS_TYPE = "DOT";
}

END MODULE;


/* * * * * * *  Contents of NET file SPTCOREV2.NET  * * * * * * */

/*******************************************************/
/*  Netlist copyright (C) 1989 LSI Logic Corporation  */
/*******************************************************/


MODULE SPTCOREV2;
```

```
INPUTS         ALE,CMEM_CS_,COF_ADRIN.2,COF_ADRIN.1,COF_ADRIN.0,CP,
               INT_GT_1IN,MR_CS_,PA.6,PA.5,PA.4,PA.3,PA.2,PA.1,PA.0,
               PDI.15,PDI.14,PDI.13,PDI.12,PDI.11,PDI.10,PDI.9,PDI.8,
               PDI.7,PDI.6,PDI.5,PDI.4,PDI.3,PDI.2,PDI.1,PDI.0,
               PLR_CS_,PXL_EN,RC0.7,RC0.6,RC0.5,RC0.4,RC0.3,RC0.2,
               RC0.1,RC0.0,RC1.7,RC1.6,RC1.5,RC1.4,RC1.3,RC1.2,RC1.1,
               RC1.0,RC2.7,RC2.6,RC2.5,RC2.4,RC2.3,RC2.2,RC2.1,RC2.0,
               RC3.7,RC3.6,RC3.5,RC3.4,RC3.3,RC3.2,RC3.1,RC3.0,RC4.7,
               RC4.6,RC4.5,RC4.4,RC4.3,RC4.2,RC4.1,RC4.0,RDY_I,
               RESET_,SEL00,SEL01,SEL10,SEL11,STOP,STRT,TST,WAIT,WR_,
               XAU_HCS_,XAU_LCS_,XDIM_CS_,XSCNIN,YAU_HCS_,YAU_LCS_,
               YDIM_CS_,YDWN,YSCNIN,YUP;
OUTPUTS        BMYL.4,BMYL.3,BMYL.2,BMYL.1,BMYL.0,CLRXCNT_,CNVL.12,
               CNVL.11,CNVL.10,CNVL.9,CNVL.8,CNVL.7,CNVL.6,CNVL.5,
               CNVL.4,CNVL.3,CNVL.2,CNVL.1,CNVL.0,PDO.15,PDO.14,
               PDO.13,PDO.12,PDO.11,PDO.10,PDO.9,PDO.8,PDO.7,PDO.6,
               PDO.5,PDO.4,PDO.3,PDO.2,PDO.1,PDO.0,REQ_I,REQ_O,STB_I,
               YINT,YINTSND;

LEVEL FUNCTION;
DEFINE
  /* implicit connectors *******************/

   PA-.6 = (PA.6);
   PA-.5 = (PA.5);
   PA-.4 = (PA.4);
   PA-.3 = (PA.3);
   PA-.2 = (PA.2);
   PA-.1 = (PA.1);
   PA-.0 = (PA.0);
   ALE- = (ALE);
   XAU_HCS_- = (XAU_HCS_);
   XAU_LCS_- = (XAU_LCS_);
   YAU_HCS_- = (YAU_HCS_);
   YAU_LCS_- = (YAU_LCS_);
   CMEM_CS_- = (CMEM_CS_);
   PLR_CS_- = (PLR_CS_);
   SEL00- = (SEL00);
   SEL01- = (SEL01);
   SEL10- = (SEL10);
   SEL11- = (SEL11);
   TST- = (TST);
   XSCNIN- = (XSCNIN);
   YSCNIN- = (YSCNIN);
   RC0-.7 = (RC0.7);
   RC0-.6 = (RC0.6);
   RC0-.5 = (RC0.5);
   RC0-.4 = (RC0.4);
   RC0-.3 = (RC0.3);
   RC0-.2 = (RC0.2);
   RC0-.1 = (RC0.1);
   RC0-.0 = (RC0.0);
   RC1-.7 = (RC1.7);
   RC1-.6 = (RC1.6);
   RC1-.5 = (RC1.5);
   RC1-.4 = (RC1.4);
   RC1-.3 = (RC1.3);
   RC1-.2 = (RC1.2);
   RC1-.1 = (RC1.1);
   RC1-.0 = (RC1.0);
   RC2-.7 = (RC2.7);
   RC2-.6 = (RC2.6);
   RC2-.5 = (RC2.5);
   RC2-.4 = (RC2.4);
   RC2-.3 = (RC2.3);
   RC2-.2 = (RC2.2);
   RC2-.1 = (RC2.1);
   RC2-.0 = (RC2.0);
   RC4-.7 = (RC4.7);
   RC4-.6 = (RC4.6);
   RC4-.5 = (RC4.5);
   RC4-.4 = (RC4.4);
   RC4-.3 = (RC4.3);
```

```
RC4-.2 = (RC4.2);
RC4-.1 = (RC4.1);
RC4-.0 = (RC4.0);
COF_ADRIN-.2 = (COF_ADRIN.2);
COF_ADRIN-.1 = (COF_ADRIN.1);
COF_ADRIN-.0 = (COF_ADRIN.0);
BMYL-.4 = (BMYL.4);
BMYL-.3 = (BMYL.3);
BMYL-.2 = (BMYL.2);
BMYL-.1 = (BMYL.1);
BMYL-.0 = (BMYL.0);
CLRXCNT_- = (CLRXCNT_);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
YINT- = (YINT);
YINTSND- = (YINTSND);
INT_GT_1IN- = (INT_GT_1IN);
INT_GT_1IN- = (INT_GT_1IN);
NOS-.1 = (NOS.1);
NOS-.0 = (NOS.0);
NOS-.1 = (NOS.1);
NOS-.0 = (NOS.0);
CP- = (CP);
CP- = (CP);
S_MODE- = (S_MODE);
S_MODE- = (S_MODE);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
WR_- = (WR_);
```

```
WR_- = (WR_);
XDIM_CS_- = (XDIM_CS_);
YDIM_CS_- = (YDIM_CS_);
MR_CS_- = (MR_CS_);
MR_CS_- = (MR_CS_);
RESET_- = (RESET_);
BRESET_- = (BRESET_);
BRESET_- = (BRESET_);
BRESET_- = (BRESET_);
REQ_O- = (REQ_O);
STB_I- = (STB_I);
STB_I- = (STB_I);
EOR- = (EOR);
EOR- = (EOR);
STOP- = (STOP);
STRT- = (STRT);
YDWN- = (YDWN);
YDWN- = (YDWN);
YUP- = (YUP);
YUP- = (YUP);
REQ_I- = (REQ_I);
REQ_I- = (REQ_I);
RDY_I- = (RDY_I);
RDY_I- = (RDY_I);
BWAIT- = (BWAIT);
BWAIT- = (BWAIT);
BWAIT- = (BWAIT);
WAIT- = (WAIT);
HLT- = (HLT);
HLT- = (HLT);
PXL_EN- = (PXL_EN);
PXL_EN- = (PXL_EN);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);


/* part instances **************************/

U6(BRESET_-=Z) = B3A(RESET_-=A);
U2(U2.Z-=Z) = N1B(REQ_I-=A);
U4(BWAIT-=Z) = OR2C(U5.Z-=A,WAIT-=B);
U5(U5.Z-=Z) = AO3C(U2.Z-=A,RDY_I-=B,U3.Z-=C,U3.Z-=D);
U3(U3.Z-=Z) = N1B(HLT-=A);
U1(NOS-.1=NOS.1,NOS-.0=NOS.0,U1.CLRXAU-=CLRXAU,U1.SPR-.1=SPR.1,
        U1.SPR-.0=SPR.0,U1.EOC-=EOC,U1.CMAGEN-=CMAGEN,
        U1.SPRCYC-=SPRCYC,U1.LIM-=LIM,U1.LS_1-=LS_1,U1.PSE-=PSE,
        U1.YADRSEL-=YADRSEL,U1.S-=S,U1.YINCEN-=YINCEN,
        U1.SCNDCOL-=SCNDCOL,U1.FRSTROW-=FRSTROW,U1.SCNDROW-=SCNDROW,
        U1.LSTROW_1-=LSTROW_1,U1.LSTROW-=LSTROW,U1.DUP-=DUP,
        U1.SE-=SE,U1.ENXAU-=ENXAU,U1.ENYAU-=ENYAU,U1.CLRYAU-=CLRYAU,
        REQ_O-=REQ_O,STB_I-=STB,REQ_I-=REQ,HLT-=HLT) =
        CNVCNTV4(INT_GT_1IN-=INT_GT_1IN,PXL_EN-=PXL_EN,
        U0.DLY_POL-=DLY_POL,U0.XINT_GT_1-=INCX,U0.INCY-=INCY,
        CP-=CP,S_MODE-=S_MODE,PDI-.15=PDI.15,PDI-.14=PDI.14,
        PDI-.13=PDI.13,PDI-.12=PDI.12,PDI-.11=PDI.11,PDI-.10=PDI.10,
```

```
            PDI-.9=PDI.9,PDI-.8=PDI.8,PDI-.7=PDI.7,PDI-.6=PDI.6,
            PDI-.5=PDI.5,PDI-.4=PDI.4,PDI-.3=PDI.3,PDI-.2=PDI.2,
            PDI-.1=PDI.1,PDI-.0=PDI.0,WR_-=WR_,XDIM_CS_-=XDIM_CS_,
            YDIM_CS_-=YDIM_CS_,MR_CS_-=MR_CS_,BRESET_-=RESET_,
            EOR-=EOR,BWAIT-=WAIT,RDY_I-=RDY,STOP-=STOP,STRT-=STRT,
            YDWN-=YDWN,YUP-=YUP);
    U0(U0.DLY_POL-=DLY_POL,U0.XINT_GT_1-=XINT_GT_1,U0.INCY-=INCY,
            S_MODE-=S_MODE,EOR-=EOR,BMYL-.4=BMYL.4,BMYL-.3=BMYL.3,
            BMYL-.2=BMYL.2,BMYL-.1=BMYL.1,BMYL-.0=BMYL.0,
            CLRXCNT_-=CLRXCNT_,PDO-.15=PDO.15,PDO-.14=PDO.14,
            PDO-.13=PDO.13,PDO-.12=PDO.12,PDO-.11=PDO.11,PDO-.10=PDO.10,
            PDO-.9=PDO.9,PDO-.8=PDO.8,PDO-.7=PDO.7,PDO-.6=PDO.6,
            PDO-.5=PDO.5,PDO-.4=PDO.4,PDO-.3=PDO.3,PDO-.2=PDO.2,
            PDO-.1=PDO.1,PDO-.0=PDO.0,YINT-=YINT,YINTSND-=YINTSND,
            CNVL-.12=CNVL.12,CNVL-.11=CNVL.11,CNVL-.10=CNVL.10,
            CNVL-.9=CNVL.9,CNVL-.8=CNVL.8,CNVL-.7=CNVL.7,CNVL-.6=CNVL.6,
            CNVL-.5=CNVL.5,CNVL-.4=CNVL.4,CNVL-.3=CNVL.3,CNVL-.2=CNVL.2,
            CNVL-.1=CNVL.1,CNVL-.0=CNVL.0) = CNV_V4(NOS-.1=NOS.1,
            NOS-.0=NOS.0,U1.CLRXAU-=CLRXAU,U1.SPR-.1=SPR.1,
            U1.SPR-.0=SPR.0,U1.EOC-=EOC,U1.CMAGEN-=CMAGEN,
            U1.SPRCYC-=SPRCYC,U1.LIM-=LIM,U1.LS_1-=LS_1,U1.PSE-=PSE,
            U1.YADRSEL-=YADRSEL,U1.S-=S,U1.YINCEN-=YINCEN,
            U1.SCNDCOL-=SCNDCOL,U1.FRSTROW-=FRSTROW,U1.SCNDROW-=SCNDROW,
            U1.LSTROW_1-=LSTROW_1,U1.LSTROW-=LSTROW,U1.DUP-=DUP,
            U1.SE-=SE,U1.ENXAU-=ENXAU,U1.ENYAU-=ENYAU,U1.CLRYAU-=CLRYAU,
            PA-.6=PA.6,PA-.5=PA.5,PA-.4=PA.4,PA-.3=PA.3,PA-.2=PA.2,
            PA-.1=PA.1,PA-.0=PA.0,ALE-=ALE,XAU_HCS_-=XAU_HCS_,
            XAU_LCS_-=XAU_LCS_,YAU_HCS_-=YAU_HCS_,YAU_LCS_-=YAU_LCS_,
            CMEM_CS_-=CMEM_CS_,PLR_CS_-=PLR_CS_,MR_CS_-=MR_CS_,
            SEL00-=SEL00,SEL01-=SEL01,SEL10-=SEL10,SEL11-=SEL11,
            TST-=TST,XSCNIN-=XSCNIN,YSCNIN-=YSCNIN,CP-=CP,RC0-.7=RC0.7,
            RC0-.6=RC0.6,RC0-.5=RC0.5,RC0-.4=RC0.4,RC0-.3=RC0.3,
            RC0-.2=RC0.2,RC0-.1=RC0.1,RC0-.0=RC0.0,RC1-.7=RC1.7,
            RC1-.6=RC1.6,RC1-.5=RC1.5,RC1-.4=RC1.4,RC1-.3=RC1.3,
            RC1-.2=RC1.2,RC1-.1=RC1.1,RC1-.0=RC1.0,RC2-.7=RC2.7,
            RC2-.6=RC2.6,RC2-.5=RC2.5,RC2-.4=RC2.4,RC2-.3=RC2.3,
            RC2-.2=RC2.2,RC2-.1=RC2.1,RC2-.0=RC2.0,RC3-.7=RC3.7,
            RC3-.6=RC3.6,RC3-.5=RC3.5,RC3-.4=RC3.4,RC3-.3=RC3.3,
            RC3-.2=RC3.2,RC3-.1=RC3.1,RC3-.0=RC3.0,RC4-.7=RC4.7,
            RC4-.6=RC4.6,RC4-.5=RC4.5,RC4-.4=RC4.4,RC4-.3=RC4.3,
            RC4-.2=RC4.2,RC4-.1=RC4.1,RC4-.0=RC4.0,INT_GT_1IN-=INT_GT_1IN,
            COF_ADRIN-.2=COF_ADRIN.2,COF_ADRIN-.1=COF_ADRIN.1,
            COF_ADRIN-.0=COF_ADRIN.0,YUP-=YUP,YDWN-=YDWN,PDI-.15=PDI.15,
            PDI-.14=PDI.14,PDI-.13=PDI.13,PDI-.12=PDI.12,PDI-.11=PDI.11,
            PDI-.10=PDI.10,PDI-.9=PDI.9,PDI-.8=PDI.8,PDI-.7=PDI.7,
            PDI-.6=PDI.6,PDI-.5=PDI.5,PDI-.4=PDI.4,PDI-.3=PDI.3,
            PDI-.2=PDI.2,PDI-.1=PDI.1,PDI-.0=PDI.0,WR_-=WR_,
            STB_I-=STB_I,BRESET_-=RESET_,BWAIT-=WAIT,PXL_EN-=PXL_EN);

  /* extractors ******************************/


  /* type converters *********************/

ANNOTATIONS
{
  BUS BUS_TYPE = "DOT";
}

END MODULE;


/* * * * * * *  Contents of NET file HBIV1.NET  * * * * * * */

/****************************************************/
/*  Netlist copyright (C) 1989 LSI Logic Corporation  */
/****************************************************/


MODULE HBIV1;
```

```
INPUTS          ALE,CS_,MPA.7,MPA.6,MPA.5,MPA.4,MPA.3,MPA.2,MPA.1,
                MPA.0,RD_,RESET_;
OUTPUTS         CMEM_CS_,MPD_OE_,MR_CS_,PA.6,PA.5,PA.4,PA.3,PA.2,PA.1,
                PA.0,PLR_CS_,SEL00,SEL01,SEL10,SEL11,XAU_HCS_,
                XAU_LCS_,XDIM_CS_,YAU_HCS_,YAU_LCS_,YDIM_CS_;

LEVEL FUNCTION;
DEFINE
  /* implicit connectors *******************/

    YDIM_CS_- = (YDIM_CS_);
    YAU_LCS_- = (YAU_LCS_);
    YAU_HCS_- = (YAU_HCS_);
    XDIM_CS_- = (XDIM_CS_);
    XAU_LCS_- = (XAU_LCS_);
    MR_CS_- = (MR_CS_);
    CMEM_CS_- = (CMEM_CS_);
    MPD_OE_- = (MPD_OE_);
    MPA-.7 = (MPA.7);
    MPA-.6 = (MPA.6);
    MPA-.5 = (MPA.5);
    MPA-.4 = (MPA.4);
    MPA-.3 = (MPA.3);
    MPA-.2 = (MPA.2);
    MPA-.1 = (MPA.1);
    MPA-.0 = (MPA.0);
    RESET_- = (RESET_);
    BRESET_- = (BRESET_);
    BRESET_- = (BRESET_);
    ALE- = (ALE);
    PA-.6 = (PA.6);
    PA-.5 = (PA.5);
    PA-.4 = (PA.4);
    PA-.3 = (PA.3);
    PA-.2 = (PA.2);
    PA-.1 = (PA.1);
    PA-.0 = (PA.0);
    RD_- = (RD_);
    CS_- = (CS_);
    PLR_CS_- = (PLR_CS_);
    SEL00- = (SEL00);
    SEL01- = (SEL01);
    SEL10- = (SEL10);
    SEL11- = (SEL11);
    XAU_HCS_- = (XAU_HCS_);

  /* part instances **************************/

    U3(MPD_OE_-=Z) = B2A(U0.MPD_OE-=A);
    U1(BRESET_-=Z) = B3A(RESET_-=A);
    U2.7(U2.Q-.7=Q) = LD3A(MPA-.7=D,BRESET_-=CD,ALE-=G);
    U2.6(U2.Q-.6=Q) = LD3A(MPA-.6=D,BRESET_-=CD,ALE-=G);
    U2.5(U2.Q-.5=Q) = LD3A(MPA-.5=D,BRESET_-=CD,ALE-=G);
    U2.4(U2.Q-.4=Q) = LD3A(MPA-.4=D,BRESET_-=CD,ALE-=G);
    U2.3(U2.Q-.3=Q) = LD3A(MPA-.3=D,BRESET_-=CD,ALE-=G);
    U2.2(U2.Q-.2=Q) = LD3A(MPA-.2=D,BRESET_-=CD,ALE-=G);
    U2.1(U2.Q-.1=Q) = LD3A(MPA-.1=D,BRESET_-=CD,ALE-=G);
    U2.0(U2.Q-.0=Q) = LD3A(MPA-.0=D,BRESET_-=CD,ALE-=G);
    U0(YDIM_CS_-=YDIM_CS_,YAU_LCS_-=YAU_LCS_,YAU_HCS_-=YAU_HCS_,
            XDIM_CS_-=XDIM_CS_,XAU_LCS_-=XAU_LCS_,XAU_HCS_-=XAU_HCS_,
            MR_CS_-=MR_CS_,CMEM_CS_-=CMEM_CS_,U0.MPD_OE-=MPD_OE,
            PLR_CS_-=PLR_CS_,SEL00-=SEL00,SEL01-=SEL01,SEL10-=SEL10,
            SEL11-=SEL11) = PADECV1(U0.MPA7-=MPA7,U0.MPA0-=MPA0,
            U0.MPA1-=MPA1,U0.MPA2-=MPA2,U0.MPA3-=MPA3,U0.MPA4-=MPA4,
            U0.MPA5-=MPA5,U0.MPA6-=MPA6,RD_-=RD_,CS_-=CS_);

  /* extractors ******************************/

    U2.Q-.2 = (U0.MPA2-);
    U2.Q-.1 = (U0.MPA1-);
    U2.Q-.5 = (U0.MPA5-);
```

```
    U2.Q-.4 = (U0.MPA4-);
    U2.Q-.0 = (U0.MPA0-);
    U2.Q-.6 = (PA-.6);
    U2.Q-.5 = (PA-.5);
    U2.Q-.4 = (PA-.4);
    U2.Q-.3 = (PA-.3);
    U2.Q-.2 = (PA-.2);
    U2.Q-.1 = (PA-.1);
    U2.Q-.0 = (PA-.0);
    U2.Q-.3 = (U0.MPA3-);
    U2.Q-.7 = (U0.MPA7-);
    U2.Q-.6 = (U0.MPA6-);


  /* type converters *********************/

ANNOTATIONS
{
  BUS BUS_TYPE = "DOT";
}

END MODULE;


/* * * * * * *  Contents of NET file YAUCNTV4.NET  * * * * * * */

/* Generated by SYN Version 0.96 */


MODULE YAUCNTV4;
INPUTS
      CP, YINT, YINT_1, ENYAU,
      YINCEN, CLRYAU, FR, SR,
      LR_1, LR, LIM, LS_1;
OUTPUTS
      DCR, HLD, YINTSND, CE,
      EOR, RST, CLRCNT, INCY,
      RLD, CLD;
DEFINE
    CLD = (W-56);
    RLD = (W-55);
    INCY = (W-54);
    CLRCNT = (W-53);
    RST = (W-52);
    EOR = (W-51);
    CE = (W-50);
    YINTSND = (W-49);
    HLD = (W-48);
    DCR = (W-47);
    CORE(W-44, W-45, W-46, W-47,
      W-48, W-49, W-50, W-51,
      W-52, W-53, W-54, W-55,
      W-56)
    = YAUCNTV4CR(YINT, YINT_1, ENYAU, YINCEN,
      CLRYAU, FR, SR, LR_1,
      LR, LIM, LS_1, W-88,
      W-86, W-84);
    M-1(W-84, W-85)
    = FD1A(W-44, CP);
    M-2(W-86, W-87)
    = FD1A(W-45, CP);
    M-3(W-88, W-89)
    = FD1A(W-46, CP);
END MODULE;

MODULE YAUCNTV4CR;
INPUTS
    YINT, YINT_1, ENYAU, YINCEN,
    CLRYAU, FR, SR, LR_1,
    LR, LIM, LS_1, STBIT0I,
    STBIT1I, STBIT2I;
OUTPUTS
    STBIT2O, STBIT1O, STBIT0O, DCR,
```

```
    HLD, YINTSND, CE, EOR,
    RST, CLRCNT, INCY, RLD,
    CLD;
DEFINE
    W148 = (YINT);
    W142 = (YINT_1);
    W140 = (ENYAU);
    W135 = (YINCEN);
    W133 = (CLRYAU);
    W129 = (FR);
    W128 = (SR);
    W122 = (LR_1);
    W121 = (LR);
    W119 = (LIM);
    W117 = (LS_1);
    W112 = (STBIT0I);
    W107 = (STBIT1I);
    W106 = (STBIT2I);
    STBIT2O = (W104);
    STBIT1O = (W103);
    STBIT0O = (W99);
    DCR = (W97);
    HLD = (W95);
    YINTSND = (W92);
    CE = (W91);
    EOR = (W87);
    RST = (W85);
    CLRCNT = (W79);
    INCY = (W76);
    RLD = (W73);
    CLD = (W69);
    M4(W67) =
      N1B(W135);
    M3(W65) =
      AND2B(W67, W119);
    M2(W64) =
      N1D(W112);
    M1(W59) =
      AND2B(W117, W64);
    M7(W57) =
      N1D(W107);
    M8(W56) =
      ND3B(W65, W59, W57);
    M9(W54) =
      N1C(W106);
    M10(W53) =
      ND3B(W133, W172, W54);
    M11(W52) =
      ND3B(W133, W172, W57);
    M12(W49) =
      N1D(W133);
    M13(W169) =
      AND3C(W148, W173, W49);
    M14(W168) =
      N1C(W129);
    M15(W167) =
      N1C(W128);
    M16(W166) =
      N1C(W122);
    M17(W165) =
      AND3B(W168, W167, W166);
    M18(W164) =
      N1C(W121);
    M19(W163) =
      ND2B(W164, W64);
    M20(W162) =
      ND2B(W171, W170);
    M21(W161) =
      NR2B(W163, W162);
    M22(W160) =
      ND3B(W169, W165, W161);
    M23(W159) =
      ND2B(W148, W173);
```

```
M24(W158) =
  ND2B(W49, W168);
M25(W157) =
  NR2B(W159, W158);
M26(W156) =
  ND2B(W167, W166);
M27(W155) =
  N1C(W119);
M28(W154) =
  ND2B(W121, W155);
M29(W153) =
  NR2B(W156, W154);
M30(W152) =
  AND3C(W64, W171, W170);
M31(W151) =
  ND3C(W157, W153, W152);
M32(W150) =
  AND2B(W148, W173);
M33(W149) =
  AND2B(W49, W119);
M35(W147) =
  ND3C(W150, W149, W152);
M36(W146) =
  N1C(W140);
M37(W145) =
  AND2C(W146, W49);
M38(W144) =
  AND2B(W64, W171);
M39(W143) =
  ND3B(W145, W144, W170);
M41(W141) =
  AND3B(W168, W167, W164);
M43(W139) =
  ND3B(W169, W141, W152);
M44(W138) =
  AND2B(W173, W49);
M45(W137) =
  AND2B(W172, W57);
M46(W136) =
  ND3B(W138, W137, W170);
M48(W134) =
  AND3B(W167, W166, W164);
M50(W132) =
  ND3B(W169, W134, W152);
M51(W131) =
  N1B(W148);
M52(W130) =
  AND2B(W131, W173);
M55(W127) =
  ND3B(W130, W149, W152);
M56(W126) =
  AND2B(W142, W173);
M57(W125) =
  AND2C(W49, W172);
M58(W124) =
  AND2B(W171, W54);
M59(W123) =
  ND3C(W126, W125, W124);
M62(W120) =
  ND3C(W145, W137, W170);
M64(W118) =
  AND3B(W168, W166, W164);
M66(W116) =
  ND3B(W169, W118, W152);
M67(W115) =
  ND4B(W135, W155, W64, W57);
M68(W114) =
  N1B(W142);
M69(W113) =
  AND2B(W114, W173);
M71(W111) =
  AND2C(W57, W54);
M72(W110) =
  ND3B(W113, W125, W111);
```

```
M73(W109) =
  ND4B(W133, W64, W171, W170);
M74(W108) =
  ND3B(W131, W64, W171);
M77(W105) =
  ND3C(W138, W144, W54);
M80(W102) =
  ND3B(W145, W137, W54);
M81(W101) =
  AND3C(W148, W142, W173);
M82(W100) =
  AND3B(W49, W119, W172);
M84(W98) =
  ND3B(W101, W100, W111);
M86(W96) =
  AND3B(W49, W166, W172);
M88(W94) =
  ND3B(W101, W96, W111);
M89(W93) =
  ND4B(W67, W64, W57, W170);
M92(W90) =
  AND3B(W172, W57, W54);
M93(W89) =
  ND3B(W113, W149, W90);
M94(W88) =
  ND4B(W135, W64, W57, W170);
M96(W86) =
  AND3B(W49, W129, W155);
M98(W84) =
  ND3B(W101, W86, W144);
M99(W83) =
  AND2B(W148, W142);
M100(W82) =
  AND2B(W49, W122);
M101(W81) =
  AND3B(W155, W64, W171);
M102(W80) =
  ND3B(W83, W82, W81);
M104(W78) =
  AND3B(W49, W168, W167);
M105(W77) =
  ND2B(W166, W64);
M107(W75) =
  NR2B(W77, W162);
M108(W74) =
  ND3B(W101, W78, W75);
M110(W72) =
  AND3B(W49, W164, W64);
M111(W71) =
  AND2B(W171, W170);
M112(W70) =
  ND3B(W101, W72, W71);
M114(W68) =
  AND3B(W49, W122, W155);
M116(W66) =
  ND3C(W101, W68, W90);
M119(W63) =
  ND3B(W83, W125, W57);
M120(W62) =
  AND2B(W135, W119);
M121(W61) =
  N1B(W117);
M122(W60) =
  AND2B(W61, W64);
M124(W58) =
  ND3B(W62, W60, W111);
M127(W55) =
  ND3B(W62, W59, W57);
M131(W51) =
  ND3B(W113, W125, W124);
M132(W50) =
  ND4B(W142, W49, W172, W57);
M134(W48) =
  AND2B(W172, W171);
```

```
M135(W47) =
  ND3B(W145, W48, W54);
M136(W46) =
  ND4B(W146, W49, W64, W171);
M137(W45) =
  ND3B(W64, W171, W54);
M138(W44) =
  ND3B(W67, W64, W57);
M139(W43) =
  AND2B(W56, W143);
M140(W42) =
  AND2B(W120, W105);
M141(W41) =
  AND2B(W93, W84);
M142(W104) =
  ND3B(W43, W42, W41);
M143(W40) =
  AND3B(W115, W105, W88);
M144(W39) =
  AND3B(W80, W66, W55);
M145(W38) =
  AND2B(W47, W46);
M146(W103) =
  ND3B(W40, W39, W38);
M147(W37) =
  AND2B(W160, W147);
M148(W36) =
  AND2B(W120, W102);
M149(W35) =
  AND3B(W70, W50, W47);
M150(W99) =
  ND3B(W37, W36, W35);
M151(W34) =
  AND3B(W147, W139, W136);
M152(W33) =
  AND3B(W132, W120, W116);
M153(W32) =
  ND2B(W105, W63);
M154(W31) =
  ND2B(W51, W46);
M155(W30) =
  NR2B(W32, W31);
M156(W97) =
  ND3B(W34, W33, W30);
M157(W29) =
  ND3B(W53, W52, W151);
M158(W28) =
  ND2B(W123, W120);
M159(W27) =
  NR2B(W29, W28);
M160(W26) =
  ND3B(W110, W109, W108);
M161(W25) =
  ND2B(W102, W58);
M162(W24) =
  NR2B(W26, W25);
M163(W23) =
  ND2B(W47, W46);
M164(W22) =
  ND2B(W45, W44);
M165(W21) =
  NR2B(W23, W22);
M166(W95) =
  ND3B(W27, W24, W21);
M167(W20) =
  ND2B(W151, W147);
M168(W19) =
  ND2B(W139, W136);
M169(W18) =
  NR2B(W20, W19);
M170(W17) =
  ND2B(W132, W116);
M171(W16) =
  ND2B(W105, W102);
```

```
    M172(W15) =
      NR2B(W17, W16);
    M173(W14) =
      AND3B(W98, W94, W66);
    M174(W92) =
      ND3B(W18, W15, W14);
    M175(W91) =
      ND4B(W160, W147, W98, W94);
    M176(W87) =
      ND2B(W151, W123);
    M177(W13) =
      AND2B(W53, W52);
    M178(W12) =
      AND2B(W151, W123);
    M179(W85) =
      ND3B(W13, W12, W109);
    M180(W79) =
      ND3B(W53, W52, W109);
    M181(W11) =
      ND2B(W147, W139);
    M182(W10) =
      ND2B(W136, W132);
    M183(W9) =
      NR2B(W11, W10);
    M184(W8) =
      ND2B(W123, W116);
    M185(W7) =
      ND2B(W98, W94);
    M186(W6) =
      NR2B(W8, W7);
    M187(W5) =
      AND3B(W74, W66, W51);
    M188(W76) =
      ND3B(W9, W6, W5);
    M189(W73) =
      ND3B(W127, W110, W66);
    M190(W4) =
      AND2B(W127, W89);
    M191(W3) =
      AND2B(W88, W58);
    M192(W69) =
      ND3B(W4, W3, W55);
    M133(W170) =
      N1C(W54);
    M130(W171) =
      N1C(W57);
    M129(W172) =
      N1C(W64);
    M128(W173) =
      N1C(W146);
END MODULE;


/* * * * * * *  Contents of NET file XSEQV5.NET  * * * * * * */


/* Generated by SYN Version 0.96 */


MODULE XSEQV5;
INPUTS
      CP, STRT_FLG, CO, INC,
      WAIT, RDY, DLY_POL, SPRCYC;
OUTPUTS
      LD_, CI, FC, SC,
      LC_1, LC, REQ, DUP,
      ENXAU, SE, CLRXAU, EOC,
      STBEN, CNVEN, YADRSEL, YINCEN,
      ENSPR, CLRSPR;
DEFINE
    CLRSPR = (W-74);
    ENSPR = (W-73);
    YINCEN = (W-72);
```

```
    YADRSEL = (W-71);
    CNVEN = (W-70);
    STBEN = (W-69);
    EOC = (W-68);
    CLRXAU = (W-67);
    SE = (W-66);
    ENXAU = (W-65);
    DUP = (W-64);
    REQ = (W-63);
    LC = (W-62);
    LC_1 = (W-61);
    SC = (W-60);
    FC = (W-59);
    CI = (W-58);
    LD_ = (W-57);
    CORE(W-52, W-53, W-54, W-55,
      W-56, W-57, W-58, W-59,
      W-60, W-61, W-62, W-63,
      W-64, W-65, W-66, W-67,
      W-68, W-69, W-70, W-71,
      W-72, W-73, W-74)
    = XSEQV5CR(STRT_FLG, CO, INC, WAIT,
      RDY, DLY_POL, SPRCYC, W-118,
      W-116, W-114, W-112, W-110);
    M-1(W-110, W-111)
    = FD1A(W-52, CP);
    M-2(W-112, W-113)
    = FD1A(W-53, CP);
    M-3(W-114, W-115)
    = FD1A(W-54, CP);
    M-4(W-116, W-117)
    = FD1A(W-55, CP);
    M-5(W-118, W-119)
    = FD1A(W-56, CP);
END MODULE;

MODULE XSEQV5CR;
INPUTS
    STRT_FLG, CO, INC, WAIT,
    RDY, DLY_POL, SPRCYC, STBIT0I,
    STBIT1I, STBIT2I, STBIT3I, STBIT4I;
OUTPUTS
    STBIT4O, STBIT3O, STBIT2O, STBIT1O,
    STBIT0O, LD_, CI, FC,
    SC, LC_1, LC, REQ,
    DUP, ENXAU, SE, CLRXAU,
    EOC, STBEN, CNVEN, YADRSEL,
    YINCEN, ENSPR, CLRSPR;
DEFINE
    W502 = (STRT_FLG);
    W487 = (CO);
    W483 = (INC);
    W479 = (WAIT);
    W475 = (RDY);
    W473 = (DLY_POL);
    W462 = (SPRCYC);
    W450 = (STBIT0I);
    W447 = (STBIT1I);
    W437 = (STBIT2I);
    W434 = (STBIT3I);
    W431 = (STBIT4I);
    STBIT4O = (W429);
    STBIT3O = (W427);
    STBIT2O = (W425);
    STBIT1O = (W423);
    STBIT0O = (W407);
    LD_ = (W385);
    CI = (W382);
    FC = (W381);
    SC = (W358);
    LC_1 = (W357);
    LC = (W356);
    REQ = (W353);
    DUP = (W350);
```

```
ENXAU = (W331);
SE = (W329);
CLRXAU = (W327);
EOC = (W326);
STBEN = (W323);
CNVEN = (W315);
YADRSEL = (W311);
YINCEN = (W309);
ENSPR = (W308);
CLRSPR = (W305);
M6(W299) =
  N1C(W483);
M5(W297) =
  N1D(W479);
M4(W296) =
  AND3B(W526, W299, W297);
M3(W290) =
  N1C(W462);
M2(W212) =
  N1E(W450);
M1(W192) =
  AND3B(W290, W212, W520);
M9(W166) =
  N1D(W434);
M10(W135) =
  AND3C(W519, W166, W517);
M11(W126) =
  ND3B(W296, W192, W135);
M12(W515) =
  ND2C(W526, W524);
M13(W88) =
  AND2C(W212, W520);
M14(W82) =
  N1D(W437);
M15(W79) =
  N1D(W431);
M16(W72) =
  AND3B(W82, W518, W79);
M17(W67) =
  ND3B(W123, W88, W72);
M18(W514) =
  AND3C(W526, W297, W290);
M19(W511) =
  AND3C(W212, W520, W519);
M20(W510) =
  AND2C(W518, W79);
M21(W508) =
  ND3C(W514, W511, W510);
M22(W507) =
  N1C(W475);
M23(W506) =
  AND2B(W526, W507);
M24(W504) =
  N1D(W447);
M25(W503) =
  AND2C(W212, W504);
M27(W498) =
  ND3C(W506, W503, W135);
M28(W525) =
  ND2C(W526, W297);
M29(W493) =
  AND2C(W521, W504);
M30(W490) =
  AND3B(W82, W166, W79);
M31(W489) =
  ND3C(W495, W493, W490);
M34(W482) =
  AND3B(W519, W518, W79);
M35(W481) =
  ND3C(W123, W503, W482);
M39(W471) =
  ND3B(W506, W503, W482);
M40(W469) =
  N1C(W502);
```

```
M41(W467) =
  ND2B(W469, W504);
M42(W465) =
  AND3C(W526, W483, W297);
M43(W463) =
  AND3B(W212, W520, W82);
M45(W459) =
  ND3C(W465, W463, W510);
M46(W458) =
  AND3C(W526, W297, W523);
M47(W453) =
  AND3B(W290, W212, W504);
M49(W449) =
  ND3C(W458, W453, W135);
M51(W446) =
  AND3B(W521, W520, W519);
M52(W445) =
  AND2C(W166, W79);
M53(W442) =
  ND3C(W514, W446, W445);
M55(W435) =
  AND3C(W521, W520, W82);
M57(W433) =
  ND3C(W458, W435, W445);
M61(W426) =
  ND3C(W458, W435, W510);
M64(W422) =
  AND3B(W519, W166, W79);
M65(W421) =
  ND3C(W495, W503, W422);
M66(W417) =
  N1C(W487);
M67(W414) =
  AND3C(W526, W417, W483);
M68(W413) =
  AND3B(W507, W212, W520);
M69(W411) =
  AND2B(W82, W166);
M70(W410) =
  ND3C(W414, W413, W411);
M71(W409) =
  ND3B(W469, W166, W79);
M73(W401) =
  AND3B(W297, W523, W290);
M74(W399) =
  ND2B(W212, W520);
M75(W398) =
  ND2B(W82, W166);
M76(W395) =
  NR2B(W399, W398);
M77(W394) =
  ND3B(W414, W401, W395);
M78(W391) =
  ND2B(W469, W82);
M79(W389) =
  AND2B(W526, W212);
M80(W387) =
  AND2C(W504, W82);
M82(W383) =
  ND3B(W389, W387, W445);
M85(W516) =
  ND2C(W518, W517);
M86(W377) =
  ND3B(W514, W511, W378);
M87(W374) =
  ND2B(W469, W212);
M88(W373) =
  ND2B(W526, W417);
M89(W372) =
  ND2B(W483, W297);
M90(W370) =
  NR2C(W373, W372);
M91(W369) =
  ND2B(W523, W522);
```

```
M92(W368) =
  ND2B(W212, W504);
M93(W366) =
  NR2B(W369, W368);
M94(W362) =
  AND3C(W519, W518, W517);
M95(W360) =
  ND3C(W370, W366, W362);
M99(W354) =
  ND2B(W523, W290);
M101(W352) =
  NR2B(W354, W368);
M103(W347) =
  ND3C(W370, W352, W362);
M104(W345) =
  AND2B(W526, W417);
M105(W343) =
  AND2B(W523, W522);
M106(W342) =
  AND3B(W212, W520, W517);
M107(W341) =
  ND3B(W345, W343, W342);
M108(W339) =
  AND3C(W526, W487, W483);
M109(W338) =
  AND3B(W297, W522, W212);
M110(W337) =
  ND2B(W504, W519);
M111(W335) =
  ND2B(W518, W517);
M112(W334) =
  NR2C(W337, W335);
M113(W333) =
  ND3C(W339, W338, W334);
M115(W330) =
  AND3B(W297, W290, W212);
M119(W324) =
  ND3C(W339, W330, W334);
M121(W320) =
  AND3B(W297, W523, W212);
M122(W319) =
  AND3C(W520, W82, W166);
M123(W316) =
  ND3C(W414, W320, W319);
M125(W313) =
  AND3B(W297, W507, W212);
M129(W306) =
  ND3C(W414, W313, W334);
M131(W303) =
  AND3B(W507, W212, W504);
M132(W302) =
  AND2B(W519, W518);
M133(W300) =
  ND3B(W414, W303, W302);
M137(W293) =
  ND3B(W458, W453, W302);
M139(W289) =
  AND3B(W522, W521, W520);
M140(W252) =
  AND3B(W82, W166, W517);
M141(W240) =
  ND3C(W465, W289, W252);
M145(W163) =
  ND3C(W339, W338, W319);
M147(W130) =
  AND3B(W290, W521, W520);
M149(W125) =
  ND3C(W465, W130, W252);
M151(W95) =
  AND3B(W522, W212, W504);
M153(W87) =
  ND3C(W458, W95, W135);
M154(W84) =
  AND2B(W522, W212);
```

```
M155(W83) =
  AND2B(W504, W519);
M157(W80) =
  ND3B(W84, W83, W510);
M161(W66) =
  ND3C(W339, W330, W319);
M162(W63) =
  AND3B(W526, W487, W299);
M163(W32) =
  AND3B(W297, W212, W504);
M165(W513) =
  ND3C(W63, W32, W362);
M166(W512) =
  AND3B(W526, W417, W299);
M169(W509) =
  ND3C(W512, W32, W362);
M173(W505) =
  ND3B(W458, W453, W510);
M177(W501) =
  ND3B(W414, W413, W490);
M178(W500) =
  N1B(W473);
M179(W499) =
  AND2B(W526, W500);
M181(W497) =
  AND2B(W519, W517);
M182(W496) =
  ND3B(W499, W493, W497);
M184(W494) =
  AND3B(W297, W212, W520);
M186(W492) =
  ND3B(W339, W494, W490);
M187(W491) =
  AND3C(W526, W297, W522);
M190(W488) =
  ND3C(W491, W446, W445);
M192(W486) =
  AND2B(W523, W212);
M193(W485) =
  AND3B(W504, W518, W79);
M194(W484) =
  ND3C(W495, W486, W485);
M198(W480) =
  ND3C(W458, W435, W378);
M200(W478) =
  AND2B(W507, W521);
M201(W477) =
  AND3B(W520, W82, W79);
M202(W476) =
  ND3C(W495, W478, W477);
M204(W474) =
  AND3B(W212, W504, W82);
M206(W472) =
  ND3C(W491, W474, W378);
M208(W470) =
  AND3B(W521, W504, W519);
M210(W468) =
  ND3C(W491, W470, W378);
M212(W466) =
  AND3B(W524, W212, W520);
M214(W464) =
  ND3C(W414, W466, W411);
M217(W461) =
  AND2B(W166, W517);
M218(W460) =
  ND3C(W296, W435, W461);
M221(W457) =
  AND2B(W519, W166);
M222(W456) =
  ND3C(W465, W192, W457);
M223(W455) =
  AND2B(W526, W487);
M224(W454) =
  AND2B(W299, W212);
```

```
M226(W452) =
  ND3B(W455, W454, W319);
M227(W451) =
  AND2B(W526, W299);
M230(W448) =
  ND3C(W451, W88, W72);
M234(W444) =
  ND3C(W514, W474, W378);
M235(W443) =
  AND2B(W526, W522);
M237(W441) =
  AND3B(W82, W518, W517);
M238(W440) =
  ND3C(W443, W88, W441);
M239(W439) =
  AND2C(W526, W483);
M240(W438) =
  AND2B(W297, W522);
M242(W436) =
  ND3C(W439, W438, W511);
M246(W432) =
  ND3C(W296, W511, W445);
M248(W430) =
  AND3B(W521, W504, W82);
M250(W428) =
  ND3C(W491, W430, W378);
M254(W424) =
  ND3C(W514, W463, W378);
M258(W420) =
  ND3C(W514, W470, W378);
M259(W419) =
  AND3B(W526, W417, W524);
M260(W418) =
  AND3B(W212, W504, W519);
M262(W416) =
  ND3C(W419, W418, W378);
M263(W415) =
  AND3B(W526, W487, W524);
M266(W412) =
  ND3B(W415, W418, W378);
M270(W408) =
  ND3C(W514, W430, W378);
M272(W406) =
  AND2B(W297, W521);
M273(W405) =
  AND2B(W504, W79);
M274(W404) =
  ND3B(W439, W406, W405);
M275(W403) =
  AND2B(W526, W521);
M276(W402) =
  AND2B(W520, W82);
M278(W400) =
  ND3B(W403, W402, W378);
M281(W397) =
  AND2B(W82, W518);
M282(W396) =
  ND3B(W465, W192, W397);
M285(W393) =
  AND3B(W520, W82, W518);
M286(W392) =
  ND3C(W495, W478, W393);
M288(W390) =
  AND2B(W521, W520);
M290(W388) =
  ND3C(W123, W390, W422);
M292(W386) =
  AND2B(W524, W212);
M294(W384) =
  ND3C(W455, W386, W319);
M298(W380) =
  ND3C(W506, W503, W510);
M299(W379) =
  ND4B(W526, W504, W519, W79);
```

```
M302(W376) =
  AND3B(W520, W519, W518);
M303(W375) =
  ND3C(W495, W84, W376);
M307(W371) =
  ND3C(W451, W88, W411);
M311(W367) =
  ND3C(W443, W88, W497);
M313(W365) =
  AND2B(W522, W521);
M314(W364) =
  AND3B(W504, W166, W517);
M315(W363) =
  ND3C(W495, W365, W364);
M317(W361) =
  AND2B(W290, W521);
M319(W359) =
  ND3C(W495, W361, W364);
M323(W355) =
  ND3C(W495, W493, W510);
M327(W351) =
  ND3B(W439, W406, W387);
M329(W349) =
  AND2B(W212, W518);
M330(W348) =
  ND3B(W123, W349, W517);
M332(W346) =
  AND2B(W297, W212);
M334(W344) =
  ND3B(W451, W346, W402);
M338(W340) =
  ND3B(W495, W361, W405);
M342(W336) =
  ND3C(W389, W387, W461);
M346(W332) =
  ND3C(W123, W503, W457);
M350(W328) =
  ND3C(W495, W493, W457);
M353(W325) =
  ND3B(W389, W387, W518);
M356(W322) =
  AND2B(W504, W166);
M357(W321) =
  ND3B(W439, W406, W322);
M360(W318) =
  AND2B(W520, W518);
M361(W317) =
  ND3C(W439, W346, W318);
M364(W314) =
  ND3B(W123, W493, W518);
M366(W312) =
  AND2B(W290, W504);
M368(W310) =
  ND3B(W495, W312, W445);
M371(W307) =
  ND3B(W123, W88, W518);
M374(W304) =
  ND3B(W123, W390, W82);
M377(W301) =
  ND3B(W123, W493, W519);
M380(W298) =
  ND3B(W123, W88, W519);
M383(W295) =
  ND3B(W123, W402, W517);
M384(W294) =
  ND4B(W526, W524, W521, W82);
M386(W292) =
  AND2B(W212, W519);
M387(W291) =
  ND3B(W123, W292, W517);
M390(W288) =
  ND3B(W123, W493, W517);
M391(W287) =
  ND4B(W526, W524, W82, W518);
```

```
M392(W286) =
  AND2B(W508, W498);
M393(W285) =
  AND2B(W426, W383);
M394(W284) =
  AND2B(W360, W341);
M395(W283) =
  ND3B(W286, W285, W284);
M396(W282) =
  AND2B(W240, W87);
M397(W281) =
  AND2B(W513, W509);
M398(W280) =
  ND3B(W282, W281, W505);
M399(W279) =
  NR2B(W283, W280);
M400(W278) =
  AND2B(W501, W496);
M401(W277) =
  AND2B(W472, W468);
M402(W276) =
  AND2C(W464, W460);
M403(W275) =
  ND3B(W278, W277, W276);
M404(W274) =
  AND2B(W456, W440);
M405(W273) =
  AND2B(W428, W420);
M406(W272) =
  ND3B(W274, W273, W400);
M407(W271) =
  NR2B(W275, W272);
M408(W270) =
  AND2B(W396, W384);
M409(W269) =
  AND2B(W371, W367);
M410(W268) =
  AND2B(W363, W348);
M411(W267) =
  ND3B(W270, W269, W268);
M412(W266) =
  AND2B(W340, W310);
M413(W265) =
  AND2B(W295, W291);
M414(W264) =
  ND3B(W266, W265, W288);
M415(W263) =
  NR2B(W267, W264);
M416(W429) =
  ND3B(W279, W271, W263);
M417(W262) =
  AND2B(W126, W508);
M418(W261) =
  AND2B(W481, W459);
M419(W260) =
  ND3B(W262, W261, W449);
M420(W259) =
  AND2B(W442, W426);
M421(W258) =
  AND2B(W360, W324);
M422(W257) =
  ND3B(W259, W258, W306);
M423(W256) =
  NR2B(W260, W257);
M424(W255) =
  AND2B(W125, W66);
M425(W254) =
  AND2B(W509, W501);
M426(W253) =
  ND3B(W255, W254, W484);
M428(W251) =
  AND2B(W464, W448);
M429(W250) =
  ND3B(W277, W251, W440);
```

```
M430(W249) =
  NR2B(W253, W250);
M431(W248) =
  AND2B(W428, W416);
M432(W247) =
  AND2B(W392, W380);
M433(W246) =
  AND2B(W375, W359);
M434(W245) =
  ND3B(W248, W247, W246);
M435(W244) =
  AND2B(W355, W336);
M436(W243) =
  AND2B(W314, W307);
M437(W242) =
  ND3B(W244, W243, W287);
M438(W241) =
  NR2B(W245, W242);
M439(W427) =
  ND3B(W256, W249, W241);
M441(W239) =
  AND2B(W498, W449);
M442(W238) =
  ND3B(W262, W239, W426);
M443(W237) =
  ND4B(W360, W333, W163, W87);
M444(W236) =
  NR2B(W238, W237);
M445(W235) =
  AND2B(W509, W488);
M446(W234) =
  AND2B(W468, W456);
M447(W233) =
  ND3B(W235, W234, W444);
M448(W232) =
  ND4B(W436, W432, W424, W416);
M449(W231) =
  NR2B(W233, W232);
M450(W230) =
  AND2B(W408, W388);
M451(W229) =
  AND2B(W379, W375);
M452(W228) =
  ND3B(W230, W229, W367);
M453(W227) =
  ND4B(W332, W328, W301, W298);
M454(W226) =
  NR2B(W228, W227);
M455(W425) =
  ND3B(W236, W231, W226);
M456(W225) =
  AND2B(W126, W67);
M457(W224) =
  AND2B(W508, W459);
M458(W223) =
  AND3B(W442, W433, W410);
M459(W222) =
  ND3B(W225, W224, W223);
M460(W221) =
  AND2B(W347, W333);
M461(W220) =
  AND2B(W324, W316);
M462(W219) =
  AND2B(W306, W240);
M463(W218) =
  ND3B(W221, W220, W219);
M464(W217) =
  NR2B(W222, W218);
M465(W216) =
  AND2B(W163, W125);
M466(W215) =
  AND2B(W66, W513);
M467(W214) =
  AND3B(W488, W480, W476);
```

```
M468(W213) =
  ND3B(W216, W215, W214);
M470(W211) =
  AND2B(W456, W448);
M471(W210) =
  AND2B(W440, W436);
M472(W209) =
  ND3B(W276, W211, W210);
M473(W208) =
  NR2B(W213, W209);
M474(W207) =
  AND2B(W432, W424);
M475(W206) =
  AND2B(W412, W392);
M476(W205) =
  AND2B(W388, W384);
M477(W204) =
  ND3B(W207, W206, W205);
M478(W203) =
  AND2B(W375, W371);
M479(W202) =
  AND2B(W367, W304);
M480(W201) =
  AND2B(W298, W295);
M481(W200) =
  ND3B(W203, W202, W201);
M482(W199) =
  NR2B(W204, W200);
M483(W423) =
  ND3B(W217, W208, W199);
M484(W198) =
  AND2B(W489, W410);
M485(W197) =
  AND2B(W377, W333);
M486(W196) =
  ND3B(W198, W197, W306);
M487(W195) =
  ND4B(W240, W163, W513, W488);
M488(W194) =
  NR2B(W196, W195);
M489(W193) =
  AND2B(W476, W468);
M491(W191) =
  ND3B(W193, W276, W452);
M492(W190) =
  ND4B(W428, W412, W408, W392);
M493(W189) =
  NR2B(W191, W190);
M494(W188) =
  ND4B(W388, W384, W363, W359);
M495(W187) =
  ND4B(W355, W328, W301, W294);
M496(W186) =
  NR2B(W188, W187);
M497(W407) =
  ND3B(W194, W189, W186);
M498(W185) =
  AND2B(W498, W481);
M499(W184) =
  AND2B(W471, W467);
M500(W183) =
  AND3B(W449, W442, W433);
M501(W182) =
  ND3B(W185, W184, W183);
M502(W181) =
  AND2B(W426, W421);
M503(W180) =
  AND2B(W410, W409);
M504(W179) =
  AND3B(W391, W374, W360);
M505(W178) =
  ND3B(W181, W180, W179);
M506(W177) =
  NR2B(W182, W178);
```

```
M507(W176) =
  AND2B(W333, W324);
M508(W175) =
  AND2B(W316, W306);
M509(W174) =
  AND3B(W293, W240, W163);
M510(W173) =
  ND3B(W176, W175, W174);
M511(W172) =
  AND2B(W125, W87);
M512(W171) =
  AND2B(W80, W66);
M513(W170) =
  AND3B(W513, W509, W488);
M514(W169) =
  ND3B(W172, W171, W170);
M515(W168) =
  NR2B(W173, W169);
M516(W167) =
  AND2B(W480, W476);
M518(W165) =
  AND3B(W416, W412, W392);
M519(W164) =
  ND3B(W167, W276, W165);
M521(W162) =
  AND2B(W371, W336);
M522(W161) =
  AND3B(W332, W325, W304);
M523(W160) =
  ND3B(W205, W162, W161);
M524(W159) =
  NR2B(W164, W160);
M525(W385) =
  ND3B(W177, W168, W159);
M526(W158) =
  AND2B(W449, W433);
M527(W157) =
  AND2B(W394, W347);
M528(W382) =
  ND3B(W158, W157, W505);
M529(W381) =
  ND4B(W498, W421, W332, W325);
M530(W358) =
  ND4B(W481, W471, W449, W87);
M531(W156) =
  AND3B(W67, W442, W333);
M532(W155) =
  AND3B(W324, W240, W125);
M533(W154) =
  AND3B(W492, W488, W448);
M534(W357) =
  ND3B(W156, W155, W154);
M535(W153) =
  ND3B(W498, W481, W449);
M536(W152) =
  ND2B(W433, W426);
M537(W151) =
  NR2B(W153, W152);
M538(W150) =
  ND3B(W410, W360, W347);
M539(W149) =
  ND2B(W316, W300);
M540(W148) =
  NR2B(W150, W149);
M541(W147) =
  ND3B(W87, W484, W480);
M542(W146) =
  ND3B(W476, W392, W380);
M543(W145) =
  NR2B(W147, W146);
M544(W353) =
  ND3B(W151, W148, W145);
M545(W144) =
  ND2B(W459, W442);
```

```
M546(W143) =
  ND2B(W421, W333);
M547(W142) =
  NR2B(W144, W143);
M548(W141) =
  ND2B(W324, W240);
M549(W140) =
  ND2B(W163, W125);
M550(W139) =
  NR2B(W141, W140);
M551(W138) =
  ND2B(W66, W488);
M552(W137) =
  ND2B(W472, W444);
M553(W136) =
  NR2B(W138, W137);
M554(W350) =
  ND3B(W142, W139, W136);
M556(W134) =
  AND2B(W489, W442);
M557(W133) =
  AND2B(W433, W426);
M558(W132) =
  ND3B(W262, W134, W133);
M559(W131) =
  AND2B(W377, W360);
M561(W129) =
  ND3B(W131, W176, W316);
M562(W128) =
  NR2B(W132, W129);
M563(W127) =
  AND2B(W293, W240);
M566(W124) =
  ND3B(W127, W216, W215);
M568(W122) =
  AND2B(W480, W460);
M569(W121) =
  ND3B(W235, W122, W456);
M570(W120) =
  NR2B(W124, W121);
M571(W119) =
  AND2B(W436, W432);
M572(W118) =
  AND2B(W428, W408);
M573(W117) =
  AND2B(W375, W363);
M574(W116) =
  ND3B(W119, W118, W117);
M575(W115) =
  AND2B(W359, W355);
M576(W114) =
  AND2B(W344, W328);
M577(W113) =
  ND3B(W115, W114, W317);
M578(W112) =
  NR2B(W116, W113);
M579(W331) =
  ND3B(W128, W120, W112);
M580(W111) =
  ND4B(W449, W442, W433, W421);
M581(W110) =
  ND4B(W360, W347, W333, W324);
M582(W109) =
  NR2B(W111, W110);
M583(W108) =
  ND4B(W316, W240, W163, W125);
M584(W107) =
  ND4B(W87, W66, W488, W484);
M585(W106) =
  NR2B(W108, W107);
M586(W105) =
  ND4B(W472, W456, W444, W436);
M587(W104) =
  ND4B(W404, W351, W321, W317);
```

```
M588(W103) =
  NR2B(W105, W104);
M589(W329) =
  ND3B(W109, W106, W103);
M590(W102) =
  ND2B(W481, W471);
M591(W101) =
  ND2B(W467, W409);
M592(W100) =
  NR2B(W102, W101);
M593(W99) =
  ND2B(W391, W383);
M594(W98) =
  ND2B(W374, W80);
M595(W97) =
  NR2B(W99, W98);
M596(W96) =
  AND3B(W468, W420, W336);
M597(W327) =
  ND3B(W100, W97, W96);
M598(W326) =
  ND2B(W468, W420);
M600(W94) =
  AND2B(W360, W347);
M601(W93) =
  AND3B(W316, W87, W484);
M602(W323) =
  ND3B(W158, W94, W93);
M603(W92) =
  AND2B(W67, W459);
M604(W91) =
  AND2B(W442, W433);
M605(W90) =
  AND2B(W426, W410);
M606(W89) =
  ND3B(W92, W91, W90);
M609(W86) =
  ND3B(W94, W176, W316);
M610(W85) =
  NR2B(W89, W86);
M614(W81) =
  ND3B(W219, W216, W215);
M617(W78) =
  ND3B(W235, W167, W464);
M618(W77) =
  NR2B(W81, W78);
M619(W76) =
  AND2B(W460, W448);
M620(W75) =
  AND2B(W440, W432);
M621(W74) =
  AND2B(W424, W416);
M622(W73) =
  ND3B(W76, W75, W74);
M624(W71) =
  AND2B(W384, W371);
M625(W70) =
  AND2B(W304, W295);
M626(W69) =
  ND3B(W206, W71, W70);
M627(W68) =
  NR2B(W73, W69);
M628(W315) =
  ND3B(W85, W77, W68);
M631(W65) =
  ND3B(W239, W91, W426);
M632(W64) =
  AND2B(W410, W360);
M634(W62) =
  ND3B(W64, W221, W324);
M635(W61) =
  NR2B(W65, W62);
M636(W60) =
  AND2B(W316, W300);
```

```
M637(W59) =
  AND2B(W240, W163);
M638(W58) =
  ND3B(W60, W59, W125);
M639(W57) =
  AND2B(W87, W66);
M640(W56) =
  AND2B(W488, W484);
M641(W55) =
  ND3B(W57, W56, W480);
M642(W54) =
  NR2B(W58, W55);
M643(W53) =
  AND2B(W476, W456);
M644(W52) =
  AND2B(W436, W404);
M645(W51) =
  ND3B(W53, W52, W392);
M646(W50) =
  AND2B(W388, W380);
M647(W49) =
  AND2B(W351, W321);
M648(W48) =
  ND3B(W50, W49, W317);
M649(W47) =
  NR2B(W51, W48);
M650(W311) =
  ND3B(W61, W54, W47);
M651(W46) =
  AND3B(W126, W508, W498);
M652(W45) =
  AND3B(W489, W481, W449);
M653(W44) =
  ND2B(W442, W433);
M654(W43) =
  ND2B(W426, W421);
M655(W42) =
  NR2B(W44, W43);
M656(W41) =
  ND3B(W46, W45, W42);
M657(W40) =
  AND3B(W410, W377, W360);
M658(W39) =
  AND3B(W347, W333, W324);
M659(W38) =
  ND2B(W316, W306);
M660(W37) =
  ND2B(W240, W163);
M661(W36) =
  NR2B(W38, W37);
M662(W35) =
  ND3B(W40, W39, W36);
M663(W34) =
  NR2B(W41, W35);
M664(W33) =
  AND3B(W125, W87, W66);
M666(W31) =
  ND2B(W484, W480);
M667(W30) =
  ND2B(W476, W472);
M668(W29) =
  NR2B(W31, W30);
M669(W28) =
  ND3B(W33, W170, W29);
M670(W27) =
  AND3B(W468, W464, W460);
M671(W26) =
  AND3B(W456, W448, W444);
M672(W25) =
  ND2B(W440, W436);
M673(W24) =
  ND2B(W432, W428);
M674(W23) =
  NR2B(W25, W24);
```

```
    M675(W22) =
      ND3B(W27, W26, W23);
    M676(W21) =
      NR2B(W28, W22);
    M677(W20) =
      ND2B(W424, W408);
    M678(W19) =
      ND2B(W392, W388);
    M679(W18) =
      NR2B(W20, W19);
    M680(W17) =
      ND2B(W384, W380);
    M681(W16) =
      ND2B(W375, W371);
    M682(W15) =
      NR2B(W17, W16);
    M683(W14) =
      AND3B(W367, W363, W359);
    M684(W13) =
      ND3B(W18, W15, W14);
    M685(W12) =
      AND3B(W355, W336, W332);
    M686(W11) =
      AND3B(W328, W317, W301);
    M687(W10) =
      ND2B(W298, W294);
    M688(W9) =
      ND2B(W291, W287);
    M689(W8) =
      NR2B(W10, W9);
    M690(W7) =
      ND3B(W12, W11, W8);
    M691(W6) =
      NR2B(W13, W7);
    M692(W308) =
      ND3B(W34, W21, W6);
    M693(W5) =
      AND2B(W467, W409);
    M694(W4) =
      AND2B(W391, W383);
    M695(W3) =
      AND2B(W374, W420);
    M696(W305) =
      ND3B(W5, W4, W3);
    M697(W356) =
      N1B(W459);
    M698(W309) =
      N1B(W489);
    M665(W123) =
      N1D(W515);
    M633(W378) =
      N1D(W516);
    M630(W517) =
      N1D(W79);
    M629(W518) =
      N1D(W166);
    M623(W519) =
      N1D(W82);
    M616(W520) =
      N1D(W504);
    M615(W521) =
      N1D(W212);
    M613(W522) =
      N1C(W290);
    M612(W523) =
      N1C(W507);
    M611(W524) =
      N1C(W297);
    M608(W495) =
      N1D(W525);
    M607(W526) =
      N1D(W469);
END MODULE;
```

```
/* * * * * * *  Contents of NET file AVRGR.NET  * * * * * * */

/* Generated by SYN Version 0.96 */




/* * * * * * *  Contents of NET file PADECV1.NET  * * * * * * */

/* Generated by SYN Version 0.96 */


MODULE PADECV1;
INPUTS
    MPA7, MPA6, MPA5, MPA4,
    MPA3, MPA2, MPA1, MPA0,
    RD_, CS_;
OUTPUTS
    XDIM_CS_, YDIM_CS_, XAU_HCS_, XAU_LCS_,
    YAU_HCS_, YAU_LCS_, MR_CS_, CMEM_CS_,
    PLR_CS_, SEL00, SEL01, SEL10,
    SEL11, U26, U20, U21,
    U12, CNVL, SW0, MPD_OE;
DEFINE
    W29 = (MPA7);
    W57 = (MPA6);
    W52 = (MPA5);
    W47 = (MPA4);
    W46 = (MPA3);
    W45 = (MPA2);
    W43 = (MPA1);
    W42 = (MPA0);
    W41 = (RD_);
    W39 = (CS_);
    XDIM_CS_ = (W38);
    YDIM_CS_ = (W35);
    XAU_HCS_ = (W34);
    XAU_LCS_ = (W33);
    YAU_HCS_ = (W25);
    YAU_LCS_ = (W23);
    MR_CS_ = (W22);
    CMEM_CS_ = (W21);
    PLR_CS_ = (W19);
    SEL00 = (W18);
    SEL01 = (W17);
    SEL10 = (W16);
    SEL11 = (W14);
    U26 = (W13);
    U20 = (W11);
    U21 = (W10);
    U12 = (W9);
    CNVL = (W8);
    SW0 = (W7);
    MPD_OE = (W6);
    M3(W5) =
      N1B(W29);
    M4(W69) =
      N1B(W41);
    M5(W68) =
      N1C(W39);
    M6(W67) =
      ND3B(W5, W69, W68);
    M7(W66) =
      N1B(W57);
    M8(W65) =
      N1B(W52);
    M9(W64) =
      AND3C(W29, W66, W65);
    M10(W63) =
      N1C(W47);
    M11(W62) =
      AND3B(W63, W46, W45);
```

```
M12(W61) =
  N1B(W43);
M13(W60) =
  N1C(W42);
M14(W59) =
  AND3B(W61, W60, W68);
M15(W58) =
  ND3B(W64, W62, W59);
M17(W56) =
  N1B(W46);
M18(W55) =
  AND3B(W63, W56, W45);
M19(W54) =
  AND3B(W43, W42, W68);
M20(W53) =
  ND3B(W64, W55, W54);
M22(W51) =
  N1B(W45);
M23(W50) =
  AND3C(W63, W46, W51);
M24(W49) =
  AND3B(W61, W42, W68);
M25(W48) =
  ND3B(W64, W50, W49);
M29(W44) =
  ND3B(W64, W62, W49);
M33(W40) =
  ND3B(W64, W50, W59);
M36(W37) =
  AND3B(W43, W60, W68);
M37(W36) =
  ND3B(W64, W50, W37);
M41(W32) =
  ND3C(W64, W50, W54);
M42(W31) =
  ND2B(W29, W43);
M43(W30) =
  ND2B(W29, W61);
M45(W28) =
  AND3C(W68, W29, W56);
M46(W27) =
  AND3B(W60, W51, W63);
M47(W26) =
  AND3C(W65, W66, W31);
M48(W38) =
  ND3B(W28, W27, W26);
M50(W24) =
  AND3B(W51, W42, W63);
M52(W35) =
  ND3B(W28, W24, W26);
M55(W20) =
  AND3C(W65, W66, W30);
M56(W34) =
  ND3B(W28, W27, W20);
M60(W33) =
  ND3B(W28, W24, W20);
M62(W15) =
  AND3B(W45, W60, W63);
M64(W25) =
  ND3B(W28, W15, W26);
M66(W12) =
  AND3B(W45, W42, W63);
M68(W23) =
  ND3B(W28, W12, W26);
M72(W22) =
  ND3B(W28, W12, W20);
M73(W21) =
  ND3B(W68, W31, W30);
M77(W19) =
  ND3B(W28, W15, W20);
M78(W4) =
  AND2B(W53, W48);
M79(W3) =
  AND2B(W40, W36);
```

```
    M80(W18) =
      ND3B(W4, W3, W32);
    M81(W17) =
      ND2B(W53, W44);
    M82(W16) =
      ND2B(W40, W32);
    M83(W14) =
      ND2B(W36, W32);
    M84(W13) =
      N1B(W40);
    M85(W11) =
      N1B(W48);
    M86(W10) =
      N1B(W36);
    M87(W9) =
      N1B(W32);
    M88(W8) =
      N1B(W58);
    M89(W7) =
      N1B(W44);
    M90(W6) =
      N1B(W67);
END MODULE;


/* * * * * * *  Contents of NET file SPTTOPV2.NET  * * * * * * */

/*****************************************************/
/*  Netlist copyright (C) 1989 LSI Logic Corporation  */
/*****************************************************/


MODULE SPTTOPV2;

INPUTS      ALE,COF_ADRIN.2,COF_ADRIN.1,COF_ADRIN.0,CP,CS_,
            INT_GT_1IN,MPA.7,MPA.6,MPA.5,MPA.4,MPA.3,MPA.2,MPA.1,
            MPA.0,PDI.15,PDI.14,PDI.13,PDI.12,PDI.11,PDI.10,PDI.9,
            PDI.8,PDI.7,PDI.6,PDI.5,PDI.4,PDI.3,PDI.2,PDI.1,PDI.0,
            PXL_EN,RC0.7,RC0.6,RC0.5,RC0.4,RC0.3,RC0.2,RC0.1,
            RC0.0,RC1.7,RC1.6,RC1.5,RC1.4,RC1.3,RC1.2,RC1.1,RC1.0,
            RC2.7,RC2.6,RC2.5,RC2.4,RC2.3,RC2.2,RC2.1,RC2.0,RC3.7,
            RC3.6,RC3.5,RC3.4,RC3.3,RC3.2,RC3.1,RC3.0,RC4.7,RC4.6,
            RC4.5,RC4.4,RC4.3,RC4.2,RC4.1,RC4.0,RDY_I,RD_,RESET_,
            STOP,STRT,TST,WAIT,WR_,XSCNIN,YDWN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
            CNVL.4,CNVL.3,CNVL.2,CNVL.1,CNVL.0,MPD_OE_,PDO.15,
            PDO.14,PDO.13,PDO.12,PDO.11,PDO.10,PDO.9,PDO.8,PDO.7,
            PDO.6,PDO.5,PDO.4,PDO.3,PDO.2,PDO.1,PDO.0,REQ_I,REQ_O,
            STB_I,YINT,YINTSND;

LEVEL FUNCTION;
DEFINE
  /* implicit connectors *******************/

    CLRXCNT_- = (CLRXCNT_);
    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    YDWN- = (YDWN);
    YUP- = (YUP);
    COF_ADRIN-.2 = (COF_ADRIN.2);
    COF_ADRIN-.1 = (COF_ADRIN.1);
    COF_ADRIN-.0 = (COF_ADRIN.0);
    INT_GT_1IN- = (INT_GT_1IN);
    RDY_I- = (RDY_I);
    STRT- = (STRT);
    STOP- = (STOP);
    WAIT- = (WAIT);
    PDI-.15 = (PDI.15);
```

```
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
WR_- = (WR_);
TST- = (TST);
XSCNIN- = (XSCNIN);
YSCNIN- = (YSCNIN);
CP- = (CP);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);
REQ_O- = (REQ_O);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
```

```
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
YINT- = (YINT);
YINTSND- = (YINTSND);
REQ_I- = (REQ_I);
STB_I- = (STB_I);
MPD_OE_- = (MPD_OE_);
CS_- = (CS_);
RD_- = (RD_);
ALE- = (ALE);
ALE- = (ALE);
MPA-.7 = (MPA.7);
MPA-.6 = (MPA.6);
MPA-.5 = (MPA.5);
MPA-.4 = (MPA.4);
MPA-.3 = (MPA.3);
MPA-.2 = (MPA.2);
MPA-.1 = (MPA.1);
MPA-.0 = (MPA.0);
RESET_- = (RESET_);
RESET_- = (RESET_);
PXL_EN- = (PXL_EN);


/* part instances ***************************/

U1(U1.PA-.6=PA.6,U1.PA-.5=PA.5,U1.PA-.4=PA.4,U1.PA-.3=PA.3,
        U1.PA-.2=PA.2,U1.PA-.1=PA.1,U1.PA-.0=PA.0,U1.SEL11-=SEL11,
        U1.SEL10-=SEL10,U1.SEL01-=SEL01,U1.SEL00-=SEL00,
        U1.PLR_CS_-=PLR_CS_,U1.XDIM_CS_-=XDIM_CS_,
        U1.YDIM_CS_-=YDIM_CS_,U1.XAU_HCS_-=XAU_HCS_,
        U1.XAU_LCS_-=XAU_LCS_,U1.YAU_HCS_-=YAU_HCS_,
        U1.YAU_LCS_-=YAU_LCS_,U1.CMEM_CS_-=CMEM_CS_,
        U1.MR_CS_-=MR_CS_,MPD_OE_-=MPD_OE_) = HBIV1(RESET_-=RESET_,
        CS_-=CS_,RD_-=RD_,ALE-=ALE,MPA-.7=MPA.7,MPA-.6=MPA.6,
        MPA-.5=MPA.5,MPA-.4=MPA.4,MPA-.3=MPA.3,MPA-.2=MPA.2,
        MPA-.1=MPA.1,MPA-.0=MPA.0);
U0(CLRXCNT_-=CLRXCNT_,BMYL-.4=BMYL.4,BMYL-.3=BMYL.3,BMYL-.2=BMYL.2,
        BMYL-.1=BMYL.1,BMYL-.0=BMYL.0,REQ_O-=REQ_O,CNVL-.12=CNVL.12,
        CNVL-.11=CNVL.11,CNVL-.10=CNVL.10,CNVL-.9=CNVL.9,
        CNVL-.8=CNVL.8,CNVL-.7=CNVL.7,CNVL-.6=CNVL.6,CNVL-.5=CNVL.5,
        CNVL-.4=CNVL.4,CNVL-.3=CNVL.3,CNVL-.2=CNVL.2,CNVL-.1=CNVL.1,
        CNVL-.0=CNVL.0,PDO-.15=PDO.15,PDO-.14=PDO.14,PDO-.13=PDO.13,
        PDO-.12=PDO.12,PDO-.11=PDO.11,PDO-.10=PDO.10,PDO-.9=PDO.9,
        PDO-.8=PDO.8,PDO-.7=PDO.7,PDO-.6=PDO.6,PDO-.5=PDO.5,
        PDO-.4=PDO.4,PDO-.3=PDO.3,PDO-.2=PDO.2,PDO-.1=PDO.1,
        PDO-.0=PDO.0,YINT-=YINT,YINTSND-=YINTSND,REQ_I-=REQ_I,
        STB_I-=STB_I) = SPTCOREV2(YDWN-=YDWN,YUP-=YUP,
        COF_ADRIN-.2=COF_ADRIN.2,COF_ADRIN-.1=COF_ADRIN.1,
        COF_ADRIN-.0=COF_ADRIN.0,INT_GT_1IN-=INT_GT_1IN,
        RDY_I-=RDY_I,U1.PA-.6=PA.6,U1.PA-.5=PA.5,U1.PA-.4=PA.4,
        U1.PA-.3=PA.3,U1.PA-.2=PA.2,U1.PA-.1=PA.1,U1.PA-.0=PA.0,
        U1.SEL11-=SEL11,U1.SEL10-=SEL10,U1.SEL01-=SEL01,
        U1.SEL00-=SEL00,U1.PLR_CS_-=PLR_CS_,U1.XDIM_CS_-=XDIM_CS_,
        U1.YDIM_CS_-=YDIM_CS_,U1.XAU_HCS_-=XAU_HCS_,
        U1.XAU_LCS_-=XAU_LCS_,U1.YAU_HCS_-=YAU_HCS_,
        U1.YAU_LCS_-=YAU_LCS_,U1.CMEM_CS_-=CMEM_CS_,
        U1.MR_CS_-=MR_CS_,STRT-=STRT,STOP-=STOP,WAIT-=WAIT,
        PDI-.15=PDI.15,PDI-.14=PDI.14,PDI-.13=PDI.13,PDI-.12=PDI.12,
        PDI-.11=PDI.11,PDI-.10=PDI.10,PDI-.9=PDI.9,PDI-.8=PDI.8,
```

```
            PDI-.7=PDI.7,PDI-.6=PDI.6,PDI-.5=PDI.5,PDI-.4=PDI.4,
            PDI-.3=PDI.3,PDI-.2=PDI.2,PDI-.1=PDI.1,PDI-.0=PDI.0,
            ALE-=ALE,WR_-=WR_,TST-=TST,XSCNIN-=XSCNIN,YSCNIN-=YSCNIN,
            CP-=CP,RC0-.7=RC0.7,RC0-.6=RC0.6,RC0-.5=RC0.5,RC0-.4=RC0.4,
            RC0-.3=RC0.3,RC0-.2=RC0.2,RC0-.1=RC0.1,RC0-.0=RC0.0,
            RC1-.7=RC1.7,RC1-.6=RC1.6,RC1-.5=RC1.5,RC1-.4=RC1.4,
            RC1-.3=RC1.3,RC1-.2=RC1.2,RC1-.1=RC1.1,RC1-.0=RC1.0,
            RC2-.7=RC2.7,RC2-.6=RC2.6,RC2-.5=RC2.5,RC2-.4=RC2.4,
            RC2-.3=RC2.3,RC2-.2=RC2.2,RC2-.1=RC2.1,RC2-.0=RC2.0,
            RC3-.7=RC3.7,RC3-.6=RC3.6,RC3-.5=RC3.5,RC3-.4=RC3.4,
            RC3-.3=RC3.3,RC3-.2=RC3.2,RC3-.1=RC3.1,RC3-.0=RC3.0,
            RC4-.7=RC4.7,RC4-.6=RC4.6,RC4-.5=RC4.5,RC4-.4=RC4.4,
            RC4-.3=RC4.3,RC4-.2=RC4.2,RC4-.1=RC4.1,RC4-.0=RC4.0,
            RESET_-=RESET_,PXL_EN-=PXL_EN);

  /* extractors ******************************/


  /* type converters *********************/

ANNOTATIONS
{
  BUS BUS_TYPE = "DOT";
}

END MODULE;


/* * * * * * *  Contents of NET file MR6.NET  * * * * * * */

/*******************************************************/
/*  Netlist copyright (C) 1989 LSI Logic Corporation   */
/*******************************************************/


MODULE MR6;

INPUTS      CS_,D.5,D.4,D.3,D.2,D.1,D.0,RESET_,WR_;
OUTPUTS     Q.5,Q.4,Q.3,Q.2,Q.1,Q.0;

LEVEL FUNCTION;
DEFINE
  /* implicit connectors *******************/

    RESET_- = (RESET_);
    D-.5 = (D.5);
    D-.4 = (D.4);
    D-.3 = (D.3);
    D-.2 = (D.2);
    D-.1 = (D.1);
    D-.0 = (D.0);
    WR_- = (WR_);
    CS_- = (CS_);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);


  /* part instances ***************************/

    U1(U1.Z-=Z) = OR2B(WR_-=B,CS_-=A);
    U0.5(Q-.5=Q) = FD2A(RESET_-=CD,D-.5=D,U1.Z-=CP);
    U0.4(Q-.4=Q) = FD2A(RESET_-=CD,D-.4=D,U1.Z-=CP);
    U0.3(Q-.3=Q) = FD2A(RESET_-=CD,D-.3=D,U1.Z-=CP);
    U0.2(Q-.2=Q) = FD2A(RESET_-=CD,D-.2=D,U1.Z-=CP);
    U0.1(Q-.1=Q) = FD2A(RESET_-=CD,D-.1=D,U1.Z-=CP);
    U0.0(Q-.0=Q) = FD2A(RESET_-=CD,D-.0=D,U1.Z-=CP);
```

```
  /* extractors ******************************/


  /* type converters *********************/

ANNOTATIONS
{
  BUS BUS_TYPE = "DOT";
}

END MODULE;


/* * * * * * *  Contents of NET file CNVSEQV1CR.NET  * * * * * * */

/*******************************************************/
/*  Netlist copyright (C) 1989 LSI Logic Corporation  */
/*******************************************************/


MODULE CNVSEQV1CR;

INPUTS      EOC,EOR,SNGL_CYC,SNGL_FRM,SNGL_LIN,STBIT0I,STBIT1I,
            STBIT2I,STBIT3I,STOP,STRT;
OUTPUTS     CLRYAU,ENYAU,HLT,STBIT0O,STBIT1O,STBIT2O,STBIT3O,STF;

LEVEL FUNCTION;

DEFINE
  /* implicit connectors *******************/

    STBIT2I- = (STBIT2I);
    STBIT1O- = (STBIT1O);
    ENYAU- = (ENYAU);
    STF- = (STF);
    STBIT0O- = (STBIT0O);
    STBIT0I- = (STBIT0I);
    EOC- = (EOC);
    STBIT2O- = (STBIT2O);
    HLT- = (HLT);
    CLRYAU- = (CLRYAU);
    SNGL_LIN- = (SNGL_LIN);
    SNGL_FRM- = (SNGL_FRM);
    SNGL_CYC- = (SNGL_CYC);
    STOP- = (STOP);
    STBIT3I- = (STBIT3I);
    STRT- = (STRT);
    STBIT1I- = (STBIT1I);
    EOR- = (EOR);
    STBIT3O- = (STBIT3O);


  /* part instances **************************/

    M4(M4.Z-=Z) = N1C(STBIT2I-=A);
    M139(M139.Z-=Z) = N1C(M4.Z-=A);
    M13(M13.Z-=Z) = N1B(EOR-=A);
    M14(M14.Z-=Z) = AND2B(M13.Z-=B,M2.Z-=A);
    M31(M31.Z-=Z) = AND2C(M30.Z-=A,M2.Z-=B);
    M11(M11.Z-=Z) = AND2B(M139.Z-=A,STBIT3I-=B);
    M15(M15.Z-=Z) = AND2C(M9.Z-=A,STBIT1I-=B);
    M42(M42.Z-=Z) = ND3B(M19.Z-=A,M10.Z-=B,M17.Z-=C);
    M2(M2.Z-=Z) = N1C(STOP-=A);
    M5(M5.Z-=Z) = N1C(STBIT1I-=A);
    M10(M10.Z-=Z) = AND2C(M5.Z-=B,M9.Z-=A);
    M108(M108.Z-=Z) = NR2B(M107.Z-=B,M106.Z-=A);
    M119(M119.Z-=Z) = AND2B(M77.Z-=B,M52.Z-=A);
    M17(M17.Z-=Z) = AND2B(M16.Z-=B,M139.Z-=A);
    M45(M45.Z-=Z) = AND2C(M4.Z-=A,M16.Z-=B);
    M16(M16.Z-=Z) = N1C(STBIT3I-=A);
    M55(M55.Z-=Z) = AND3B(M5.Z-=A,M4.Z-=B,M16.Z-=C);
    M133(M133.Z-=Z) = NR2B(M131.Z-=A,M132.Z-=B);
```

```
M9(M9.Z--Z) = N1C(STBIT0I--A);
M27(M27.Z--Z) = AND2C(M5.Z--B,STBIT0I--A);
M93(M93.Z--Z) = ND3B(M45.Z--C,M27.Z--B,M19.Z--A);
M123(M123.Z--Z) = AND2B(M73.Z--B,M68.Z--A);
M124(STBIT0O--Z) = ND3B(M93.Z--C,M123.Z--B,M122.Z--A);
M122(M122.Z--Z) = AND2B(M29.Z--B,M22.Z--A);
M24(M24.Z--Z) = AND2B(M9.Z--A,M139.Z--B);
M1(M1.Z--Z) = N1B(EOC--A);
M23(M23.Z--Z) = AND2B(M2.Z--A,EOC--B);
M25(M25.Z--Z) = ND3B(M24.Z--B,M23.Z--A,STBIT3I--C);
M34(M34.Z--Z) = ND3B(M31.Z--A,M10.Z--B,M28.Z--C);
M117(STBIT2O--Z) = ND3B(M115.Z--B,M112.Z--A,M116.Z--C);
M110(M110.Z--Z) = ND2B(M12.Z--A,M18.Z--B);
M112(M112.Z--Z) = NR2B(M111.Z--B,M110.Z--A);
M99(M99.Z--Z) = ND3B(M30.Z--A,M4.Z--C,M9.Z--B);
M142(M142.Z--Z) = ND3B(M99.Z--C,M97.Z--B,M94.Z--A);
M143(M143.Z--Z) = NR2B(M142.Z--B,M141.Z--A);
M144(HLT--Z) = ND3B(M143.Z--C,M140.Z--B,M137.Z--A);
M137(M137.Z--Z) = NR2B(M135.Z--A,M136.Z--B);
M136(M136.Z--Z) = ND2B(M38.Z--B,M29.Z--A);
M148(M148.Z--Z) = AND2B(M81.Z--B,M73.Z--A);
M147(M147.Z--Z) = AND2B(M56.Z--B,M52.Z--A);
M149(CLRYAU--Z) = ND3B(M148.Z--C,M147.Z--B,M146.Z--A);
M146(M146.Z--Z) = AND2B(M46.Z--B,M29.Z--A);
M101(M101.Z--Z) = ND2B(M38.Z--A,M46.Z--B);
M111(M111.Z--Z) = ND2B(M34.Z--A,M38.Z--B);
M126(M126.Z--Z) = ND3B(M34.Z--C,M29.Z--B,M25.Z--A);
M135(M135.Z--Z) = ND3B(M3.Z--A,M22.Z--B,M25.Z--C);
M22(M22.Z--Z) = ND3B(M21.Z--C,M19.Z--A,M20.Z--B);
M125(M125.Z--Z) = ND3B(M12.Z--A,M22.Z--C,M18.Z--B);
M127(M127.Z--Z) = NR2B(M126.Z--B,M125.Z--A);
M134(STF--Z) = ND3B(M133.Z--C,M130.Z--B,M127.Z--A);
M130(M130.Z--Z) = NR2B(M129.Z--B,M128.Z--A);
M129(M129.Z--Z) = ND3B(M60.Z--A,M73.Z--C,M68.Z--B);
M104(M104.Z--Z) = ND2B(M64.Z--A,M68.Z--B);
M105(M105.Z--Z) = NR2B(M104.Z--B,M103.Z--A);
M103(M103.Z--Z) = ND2B(M60.Z--B,M56.Z--A);
M114(M114.Z--Z) = ND2B(M64.Z--B,M60.Z--A);
M115(M115.Z--Z) = NR2B(M114.Z--B,M113.Z--A);
M113(M113.Z--Z) = ND2B(M56.Z--B,M52.Z--A);
M54(M54.Z--Z) = AND2B(M9.Z--B,STRT--A);
M56(M56.Z--Z) = ND3C(M55.Z--C,M54.Z--B,M53.Z--A);
M53(M53.Z--Z) = AND2B(M48.Z--B,SNGL_LIN--A);
M47(M47.Z--Z) = N1B(SNGL_LIN--A);
M69(M69.Z--Z) = N1B(SNGL_FRM--A);
M49(M49.Z--Z) = AND3B(M47.Z--B,M48.Z--C,SNGL_FRM--A);
M70(M70.Z--Z) = AND3B(M69.Z--A,M47.Z--B,M48.Z--C);
M48(M48.Z--Z) = N1B(SNGL_CYC--A);
M43(M43.Z--Z) = AND2B(STRT--B,SNGL_CYC--A);
M46(M46.Z--Z) = ND3B(M45.Z--C,M10.Z--B,M43.Z--A);
M52(M52.Z--Z) = ND3C(M50.Z--B,M49.Z--A,M45.Z--C);
M128(M128.Z--Z) = ND3B(M56.Z--C,M46.Z--A,M52.Z--B);
M140(M140.Z--Z) = NR2B(M128.Z--A,M106.Z--B);
M106(M106.Z--Z) = ND2B(M73.Z--A,M77.Z--B);
M73(M73.Z--Z) = ND3C(M70.Z--A,M50.Z--B,M45.Z--C);
M50(M50.Z--Z) = AND3B(M5.Z--C,M9.Z--B,STRT--A);
M3(M3.Z--Z) = ND3B(M5.Z--B,M4.Z--C,STOP--A);
M82(M82.Z--Z) = ND2B(M9.Z--B,STOP--A);
M141(M141.Z--Z) = ND3B(M93.Z--C,M82.Z--A,M89.Z--B);
M131(M131.Z--Z) = ND4B(M93.Z--D,M85.Z--B,M89.Z--C,M77.Z--A);
M107(M107.Z--Z) = ND2B(M97.Z--B,M85.Z--A);
M97(M97.Z--Z) = ND3B(M19.Z--A,M96.Z--B,STBIT3I--C);
M60(M60.Z--Z) = ND3B(M45.Z--C,M19.Z--A,M15.Z--B);
M64(M64.Z--Z) = ND3B(M31.Z--A,M15.Z--B,M11.Z--C);
M81(M81.Z--Z) = ND3B(M19.Z--A,M15.Z--B,M11.Z--C);
M116(M116.Z--Z) = AND3B(M89.Z--C,M81.Z--B,M77.Z--A);
M77(M77.Z--Z) = ND3C(M45.Z--C,M31.Z--A,M27.Z--B);
M89(M89.Z--Z) = ND3B(M31.Z--A,M10.Z--B,M17.Z--C);
M18(M18.Z--Z) = ND3C(M15.Z--B,M17.Z--C,M14.Z--A);
M68(M68.Z--Z) = ND3C(M27.Z--B,M28.Z--C,M14.Z--A);
M145(ENYAU--Z) = ND4B(M42.Z--C,M12.Z--A,M68.Z--D,M18.Z--B);
M118(M118.Z--Z) = AND2B(M25.Z--B,M18.Z--A);
M121(STBIT1O--Z) = ND3B(M120.Z--C,M119.Z--B,M118.Z--A);
M120(M120.Z--Z) = AND2B(M98.Z--B,M94.Z--A);
```

```
     M132(M132.Z-=Z) = ND3B(M97.Z-=B,M98.Z-=C,M94.Z-=A);
     M94(M94.Z-=Z) = ND4B(M9.Z-=B,M2.Z-=A,STBIT3I-=D,STBIT1I-=C);
     M28(M28.Z-=Z) = AND2B(M4.Z-=A,STBIT3I-=B);
     M96(M96.Z-=Z) = AND2B(M4.Z-=B,M9.Z-=A);
     M98(M98.Z-=Z) = ND4B(M30.Z-=A,M9.Z-=C,M2.Z-=B,STBIT1I-=D);
     M30(M30.Z-=Z) = N1B(STRT-=A);
     M19(M19.Z-=Z) = AND2C(STRT-=A,M2.Z-=B);
     M8(M8.Z-=Z) = AND2B(M1.Z-=B,M2.Z-=A);
     M12(M12.Z-=Z) = ND3C(M10.Z-=B,M11.Z-=C,M8.Z-=A);
     M85(M85.Z-=Z) = ND3B(M19.Z-=A,M10.Z-=B,M139.Z-=C);
     M21(M21.Z-=Z) = AND3B(M16.Z-=C,M139.Z-=B,STBIT1I-=A);
     M37(M37.Z-=Z) = AND2B(M139.Z-=B,STBIT1I-=A);
     M38(M38.Z-=Z) = ND3B(M31.Z-=A,M37.Z-=C,M20.Z-=B);
     M20(M20.Z-=Z) = AND2B(M9.Z-=B,EOR-=A);
     M26(M26.Z-=Z) = AND2B(M2.Z-=A,EOR-=B);
     M29(M29.Z-=Z) = ND3C(M27.Z-=B,M28.Z-=C,M26.Z-=A);
     M100(M100.Z-=Z) = ND2B(M12.Z-=A,M29.Z-=B);
     M102(M102.Z-=Z) = NR2B(M101.Z-=B,M100.Z-=A);
     M109(STBIT3O-=Z) = ND3B(M108.Z-=C,M105.Z-=B,M102.Z-=A);


  /* extractors ******************************/


  /* type converters *********************/

ANNOTATIONS
{
  BUS BUS_TYPE = "DOT";
}

END MODULE;


/* * * * * * *  Contents of NET file CNVSEQV1FN.NET  * * * * * * */

/*******************************************************/
/*  Netlist copyright (C) 1989 LSI Logic Corporation   */
/*******************************************************/


MODULE CNVSEQV1FN;

INPUTS       CP,EOC,EOR,RESET_,SNGL_CYC,SNGL_FRM,SNGL_LIN,STOP,
             STRT;
OUTPUTS      CLRYAU,ENYAU,HLT,STF;

LEVEL FUNCTION;
DEFINE
  /* implicit connectors *******************/

    EOC- = (EOC);
    EOR- = (EOR);
    SNGL_CYC- = (SNGL_CYC);
    SNGL_FRM- = (SNGL_FRM);
    SNGL_LIN- = (SNGL_LIN);
    STRT- = (STRT);
    HLT- = (HLT);
    STF- = (STF);
    ENYAU- = (ENYAU);
    CLRYAU- = (CLRYAU);
    RESET_- = (RESET_);
    CP- = (CP);
    STOP- = (STOP);


  /* part instances **************************/

    U2(HLT-=Q) = FD4A(CORE.HLT-=D,CP-=CP,RESET_-=SD);
    M___4(M___4.Q-=Q) = FD2A(CORE.STBIT00-=D,RESET_-=CD,CP-=CP);
    U3(STF-=Q) = FD2A(CORE.STF-=D,CP-=CP,RESET_-=CD);
    U1(ENYAU-=Q) = FD2A(CORE.ENYAU-=D,CP-=CP,RESET_-=CD);
```

```
    U0(CLRYAU-=Q) = FD2A(CORE.CLRYAU-=D,CP-=CP,RESET_-=CD);
    M___2(M___2.Q-=Q) = FD2A(CORE.STBIT2O-=D,RESET_-=CD,CP-=CP);
    M___3(M___3.Q-=Q) = FD2A(CORE.STBIT1O-=D,RESET_-=CD,CP-=CP);
    M___1(M___1.Q-=Q) = FD2A(CORE.STBIT3O-=D,RESET_-=CD,CP-=CP);
    CORE(CORE.CLRYAU-=CLRYAU,CORE.ENYAU-=ENYAU,CORE.HLT-=HLT,
            CORE.STF-=STF,CORE.STBIT3O-=STBIT3O,CORE.STBIT2O-=STBIT2O,
            CORE.STBIT1O-=STBIT1O,CORE.STBIT0O-=STBIT0O) =
            CNVSEQV1CR(EOC-=EOC,EOR-=EOR,SNGL_CYC-=SNGL_CYC,
            SNGL_FRM-=SNGL_FRM,SNGL_LIN-=SNGL_LIN,STOP-=STOP,
            STRT-=STRT,M___4.Q-=STBIT0I,M___3.Q-=STBIT1I,M___2.Q-=STBIT2I,
            M___1.Q-=STBIT3I);

  /* extractors ******************************/


  /* type converters *********************/

ANNOTATIONS
{
  BUS BUS_TYPE = "DOT";
}

END MODULE;


/* * * * * * *  Contents of NET file YSEQV4CR.NET  * * * * * * */

/******************************************************/
/*  Netlist copyright (C) 1989 LSI Logic Corporation  */
/******************************************************/


MODULE YSEQV4CR;

INPUTS      CO,EOR,INC,STBIT0I,STBIT1I,STBIT2I,STRT_FLG;
OUTPUTS     CI,FR,IR,LD_,LR,LR_1,SR,STBIT0O,STBIT1O,STBIT2O;

LEVEL FUNCTION;
DEFINE
  /* implicit connectors *******************/

    FR- = (FR);
    CO- = (CO);
    INC- = (INC);
    STBIT0I- = (STBIT0I);
    STRT_FLG- = (STRT_FLG);
    LD_- = (LD_);
    SR- = (SR);
    STBIT2I- = (STBIT2I);
    IR- = (IR);
    STBIT0O- = (STBIT0O);
    STBIT1I- = (STBIT1I);
    EOR- = (EOR);
    LR_1- = (LR_1);
    CI- = (CI);
    STBIT1O- = (STBIT1O);
    LR- = (LR);
    STBIT2O- = (STBIT2O);


  /* part instances **************************/


    M66(FR-=Z) = N1B(M2.Z-=A);
    M40(M40.Z-=Z) = AND2B(M37.Z-=A,CO-=B);
    M33(M33.Z-=Z) = ND4B(CO-=B,INC-=C,M37.Z-=A,M3.Z-=D);
    M1(M1.Z-=Z) = AND2C(M37.Z-=A,INC-=B);
    M9(M9.Z-=Z) = N1B(INC-=A);
    M41(M41.Z-=Z) = AND2B(M9.Z-=A,M38.Z-=B);
    M29(M29.Z-=Z) = ND3C(M28.Z-=C,M27.Z-=B,M10.Z-=A);
    M28(M28.Z-=Z) = AND2B(M3.Z-=B,STBIT1I-=A);
```

```
M14(M14.Z--Z) = N1C(STBIT1I--A);
M4(M4.Z--Z) = N1C(STBIT0I--A);
M37(M37.Z--Z) = N1C(M23.Z--A);
M23(M23.Z--Z) = N1C(STRT_FLG--A);
M57(LD_--Z) = ND3B(M54.Z--A,M55.Z--B,M56.Z--C);
M59(SR--Z) = ND2B(M8.Z--A,M12.Z--B);
M12(M12.Z--Z) = ND3C(M10.Z--A,M7.Z--B,STBIT2I--C);
M3(M3.Z--Z) = N1C(STBIT2I--A);
M8(M8.Z--Z) = ND3C(M1.Z--A,M7.Z--B,STBIT2I--C);
M65(IR--Z) = ND3B(M62.Z--A,M63.Z--B,M64.Z--C);
M62(M62.Z--Z) = AND2B(M8.Z--B,M2.Z--A);
M53(STBIT0O--Z) = ND3B(M29.Z--C,M8.Z--A,M22.Z--B);
M22(M22.Z--Z) = ND3B(M38.Z--B,M37.Z--A,M14.Z--C);
M55(M55.Z--Z) = AND3B(M24.Z--B,M22.Z--A,M29.Z--C);
M24(M24.Z--Z) = ND2B(M23.Z--A,M3.Z--B);
M44(M44.Z--Z) = ND2B(M23.Z--A,M14.Z--B);
M56(M56.Z--Z) = AND3B(M45.Z--C,M44.Z--B,M43.Z--A);
M45(M45.Z--Z) = ND2B(M23.Z--A,M4.Z--B);
M38(M38.Z--Z) = N1C(M4.Z--A);
M2(M2.Z--Z) = ND4C(M3.Z--D,M37.Z--A,M4.Z--B,STBIT1I--C);
M7(M7.Z--Z) = AND2B(M4.Z--A,STBIT1I--B);
M18(M18.Z--Z) = AND2B(M38.Z--A,STBIT1I--B);
M32(M32.Z--Z) = ND3B(M18.Z--B,M3.Z--C,M1.Z--A);
M19(M19.Z--Z) = ND3B(M17.Z--A,M18.Z--B,M3.Z--C);
M17(M17.Z--Z) = AND2B(M37.Z--A,EOR--B);
M26(M26.Z--Z) = N1B(EOR--A);
M27(M27.Z--Z) = AND2B(M26.Z--A,M38.Z--B);
M15(M15.Z--Z) = AND2B(M14.Z--B,M38.Z--A);
M46(M46.Z--Z) = AND3B(M16.Z--B,M19.Z--C,M12.Z--A);
M60(LR_1--Z) = ND2B(M16.Z--A,M36.Z--B);
M16(M16.Z--Z) = ND3B(STBIT2I--C,M10.Z--A,M15.Z--B);
M10(M10.Z--Z) = AND2B(M9.Z--B,M37.Z--A);
M20(M20.Z--Z) = ND4B(INC--B,M38.Z--C,M37.Z--A,M14.Z--D);
M58(CI--Z) = ND3B(M39.Z--C,M8.Z--A,M20.Z--B);
M48(M48.Z--Z) = AND2B(M42.Z--B,M39.Z--A);
M42(M42.Z--Z) = ND3B(M14.Z--C,M40.Z--A,M41.Z--B);
M43(M43.Z--Z) = ND4B(STBIT2I--D,M4.Z--B,M37.Z--A,M14.Z--C);
M52(STBIT1O--Z) = ND3B(M50.Z--A,M51.Z--B,M43.Z--C);
M50(M50.Z--Z) = AND2B(M12.Z--B,M2.Z--A);
M54(M54.Z--Z) = AND3B(M8.Z--B,M12.Z--C,M2.Z--A);
M63(M63.Z--Z) = AND2B(M19.Z--B,M12.Z--A);
M61(LR--Z) = ND3B(M29.Z--B,M19.Z--A,M32.Z--C);
M64(M64.Z--Z) = AND3B(M22.Z--A,M32.Z--C,M29.Z--B);
M51(M51.Z--Z) = AND2B(M36.Z--B,M29.Z--A);
M36(M36.Z--Z) = ND3B(STBIT2I--C,M15.Z--B,M1.Z--A);
M39(M39.Z--Z) = ND3B(M7.Z--B,M3.Z--C,M1.Z--A);
M21(M21.Z--Z) = ND4B(M4.Z--B,M37.Z--A,M14.Z--C,M3.Z--D);
M47(M47.Z--Z) = AND3B(M33.Z--C,M32.Z--B,M21.Z--A);
M49(STBIT2O--Z) = ND3B(M48.Z--C,M46.Z--A,M47.Z--B);


/* extractors ******************************/

/* type converters *********************/

ANNOTATIONS
{
  BUS BUS_TYPE = "DOT";
}

END MODULE;


/* * * * * * *  Contents of NET file YSEQV4FN.NET  * * * * * * */

/*****************************************************/
/*  Netlist copyright (C) 1989 LSI Logic Corporation  */
/*****************************************************/


MODULE YSEQV4FN;

INPUTS      CO,CP,EOR,INC,RESET_,STRT_FLG;
OUTPUTS     CI,FR,IR,LD_,LR,LR_1,SR;
```

```
LEVEL FUNCTION;
DEFINE
  /* implicit connectors *******************/

    EOR- = (EOR);
    CO- = (CO);
    SR- = (SR);
    IR- = (IR);
    LD_- = (LD_);
    LR_1- = (LR_1);
    CI- = (CI);
    LR- = (LR);
    FR- = (FR);
    CP- = (CP);
    RESET_- = (RESET_);
    STRT_FLG- = (STRT_FLG);
    INC- = (INC);


  /* part instances **************************/

    U3(LD_-=Q) = FD4A(CORE.LD_-=D,CP-=CP,RESET_-=SD);
    M___2(M___2.Q-=Q) = FD2A(RESET_-=CD,CP-=CP,CORE.STBIT2O-=D);
    U1(LR_1-=Q) = FD2A(CP-=CP,RESET_-=CD,CORE.LR_1-=D);
    M___4(M___4.Q-=Q) = FD2A(RESET_-=CD,CP-=CP,CORE.STBIT0O-=D);
    M___3(M___3.Q-=Q) = FD2A(RESET_-=CD,CP-=CP,CORE.STBIT1O-=D);
    U6(CI-=Q) = FD2A(CP-=CP,RESET_-=CD,CORE.CI-=D);
    U2(LR-=Q) = FD2A(CP-=CP,RESET_-=CD,CORE.LR-=D);
    U5(FR-=Q) = FD2A(CP-=CP,RESET_-=CD,CORE.FR-=D);
    U4(IR-=Q) = FD2A(CP-=CP,RESET_-=CD,CORE.IR-=D);
    U0(SR-=Q) = FD2A(CP-=CP,RESET_-=CD,CORE.SR-=D);
    CORE(CORE.STBIT2O-=STBIT2O,CORE.STBIT1O-=STBIT1O,CORE.STBIT0O-=STBIT0O,
            CORE.CI-=CI,CORE.FR-=FR,CORE.IR-=IR,CORE.LD_-=LD_,
            CORE.LR-=LR,CORE.LR_1-=LR_1,CORE.SR-=SR) = YSEQV4CR(
            EOR-=EOR,CO-=CO,M___4.Q-=STBIT0I,M___3.Q-=STBIT1I,
            M___2.Q-=STBIT2I,INC-=INC,STRT_FLG-=STRT_FLG);


  /* extractors *****************************/

  /* type converters *********************/

ANNOTATIONS
{
  BUS BUS_TYPE = "DOT";

  PART_INSTANCES
  {
    CORE LEVEL = "PRIM";
  }
}

END MODULE;



/* * * * * * *  Contents of NET file CNVDLY.NET  * * * * * * */

/*******************************************************/
/*  Netlist copyright (C) 1989 LSI Logic Corporation  */
/*******************************************************/


MODULE CNVDLY;

INPUTS      CP,D,DLY_POL,NOS.1,NOS.0,RESET_,WAIT;
OUTPUTS     CMAGEN,CNVEN;

LEVEL FUNCTION;
DEFINE
  /* implicit connectors *******************/

    WAIT- = (WAIT);
    RESET_- = (RESET_);
```

```
CP- = (CP);
CMAGEN- = (CMAGEN);
CNVEN- = (CNVEN);
NOS-.1 = (NOS.1);
NOS-.0 = (NOS.0);
DLY_POL- = (DLY_POL);
D- = (D);


/* part instances ***************************/

U2(U2.Z-=Z) = B3A(WAIT-=A);
U1.24(U1.Q-.24=Q) = FD2SA(U2.Z-=TE,RESET_-=CD,CP-=CP,U1.Q-.24=TI,
        U1.D-.24=D);
U1.23(U1.Q-.23=Q) = FD2SA(U2.Z-=TE,RESET_-=CD,CP-=CP,U1.Q-.23=TI,
        U1.D-.23=D);
U1.22(U1.Q-.22=Q) = FD2SA(U2.Z-=TE,RESET_-=CD,CP-=CP,U1.Q-.22=TI,
        U1.D-.22=D);
U1.21(U1.Q-.21=Q) = FD2SA(U2.Z-=TE,RESET_-=CD,CP-=CP,U1.Q-.21=TI,
        U1.D-.21=D);
U1.20(U1.Q-.20=Q) = FD2SA(U2.Z-=TE,RESET_-=CD,CP-=CP,U1.Q-.20=TI,
        U1.D-.20=D);
U1.19(U1.Q-.19=Q) = FD2SA(U2.Z-=TE,RESET_-=CD,CP-=CP,U1.Q-.19=TI,
        U1.D-.19=D);
U1.18(U1.Q-.18=Q) = FD2SA(U2.Z-=TE,RESET_-=CD,CP-=CP,U1.Q-.18=TI,
        U1.D-.18=D);
U1.17(U1.Q-.17=Q) = FD2SA(U2.Z-=TE,RESET_-=CD,CP-=CP,U1.Q-.17=TI,
        U1.D-.17=D);
U1.16(U1.Q-.16=Q) = FD2SA(U2.Z-=TE,RESET_-=CD,CP-=CP,U1.Q-.16=TI,
        U1.D-.16=D);
U1.15(U1.Q-.15=Q) = FD2SA(U2.Z-=TE,RESET_-=CD,CP-=CP,U1.Q-.15=TI,
        U1.D-.15=D);
U1.14(U1.Q-.14=Q) = FD2SA(U2.Z-=TE,RESET_-=CD,CP-=CP,U1.Q-.14=TI,
        U1.D-.14=D);
U1.13(U1.Q-.13=Q) = FD2SA(U2.Z-=TE,RESET_-=CD,CP-=CP,U1.Q-.13=TI,
        U1.D-.13=D);
U1.12(U1.Q-.12=Q) = FD2SA(U2.Z-=TE,RESET_-=CD,CP-=CP,U1.Q-.12=TI,
        U1.D-.12=D);
U1.11(U1.Q-.11=Q) = FD2SA(U2.Z-=TE,RESET_-=CD,CP-=CP,U1.Q-.11=TI,
        U1.D-.11=D);
U1.10(U1.Q-.10=Q) = FD2SA(U2.Z-=TE,RESET_-=CD,CP-=CP,U1.Q-.10=TI,
        U1.D-.10=D);
U1.9(U1.Q-.9=Q) = FD2SA(U2.Z-=TE,RESET_-=CD,CP-=CP,U1.Q-.9=TI,
        U1.D-.9=D);
U1.8(U1.Q-.8=Q) = FD2SA(U2.Z-=TE,RESET_-=CD,CP-=CP,U1.Q-.8=TI,
        U1.D-.8=D);
U1.7(U1.Q-.7=Q) = FD2SA(U2.Z-=TE,RESET_-=CD,CP-=CP,U1.Q-.7=TI,
        U1.D-.7=D);
U1.6(U1.Q-.6=Q) = FD2SA(U2.Z-=TE,RESET_-=CD,CP-=CP,U1.Q-.6=TI,
        U1.D-.6=D);
U1.5(U1.Q-.5=Q) = FD2SA(U2.Z-=TE,RESET_-=CD,CP-=CP,U1.Q-.5=TI,
        U1.D-.5=D);
U1.4(U1.Q-.4=Q) = FD2SA(U2.Z-=TE,RESET_-=CD,CP-=CP,U1.Q-.4=TI,
        U1.D-.4=D);
U1.3(U1.Q-.3=Q) = FD2SA(U2.Z-=TE,RESET_-=CD,CP-=CP,U1.Q-.3=TI,
        U1.D-.3=D);
U1.2(U1.Q-.2=Q) = FD2SA(U2.Z-=TE,RESET_-=CD,CP-=CP,U1.Q-.2=TI,
        U1.D-.2=D);
U1.1(U1.Q-.1=Q) = FD2SA(U2.Z-=TE,RESET_-=CD,CP-=CP,U1.Q-.1=TI,
        U1.D-.1=D);
U1.0(U1.Q-.0=Q) = FD2SA(U2.Z-=TE,RESET_-=CD,CP-=CP,U1.Q-.0=TI,
        U1.D-.0=D);
U0(CNVEN-=Z) = MUX81HB(U0.D1-=D1,U0.D2-=D2,U0.D3-=D3,U0.D4-=D4,
        U0.D5-=D5,U0.D6-=D6,U0.D7-=D7,U0.B-=B,U0.C-=C,
        DLY_POL-=A,U0.D0-=D0);


/* extractors ******************************/

U1.Q-.3 = (CMAGEN-);
U1.Q-.9 = (U0.D1-);
U1.Q-.12 = (U0.D2-);
U1.Q-.14 = (U0.D3-);
U1.Q-.19 = (U0.D5-);
```

```
    U1.Q-.20 = (U0.D6-);
    U1.Q-.24 = (U0.D7-);
    NOS-.0 = (U0.B-);
    NOS-.1 = (U0.C-);
    U1.Q-.8 = (U0.D0-);
    U1.Q-.16 = (U0.D4-);
    U1.Q-.23 = (M-0.23);
    U1.Q-.22 = (M-0.22);
    U1.Q-.21 = (M-0.21);
    U1.Q-.20 = (M-0.20);
    U1.Q-.19 = (M-0.19);
    U1.Q-.18 = (M-0.18);
    U1.Q-.17 = (M-0.17);
    U1.Q-.16 = (M-0.16);
    U1.Q-.15 = (M-0.15);
    U1.Q-.14 = (M-0.14);
    U1.Q-.13 = (M-0.13);
    U1.Q-.12 = (M-0.12);
    U1.Q-.11 = (M-0.11);
    U1.Q-.10 = (M-0.10);
    U1.Q-.9 = (M-0.9);
    U1.Q-.8 = (M-0.8);
    U1.Q-.7 = (M-0.7);
    U1.Q-.6 = (M-0.6);
    U1.Q-.5 = (M-0.5);
    U1.Q-.4 = (M-0.4);
    U1.Q-.3 = (M-0.3);
    U1.Q-.2 = (M-0.2);
    U1.Q-.1 = (M-0.1);
    U1.Q-.0 = (M-0.0);
    U1.D-.24 = (M-0.23);
    U1.D-.23 = (M-0.22);
    U1.D-.22 = (M-0.21);
    U1.D-.21 = (M-0.20);
    U1.D-.20 = (M-0.19);
    U1.D-.19 = (M-0.18);
    U1.D-.18 = (M-0.17);
    U1.D-.17 = (M-0.16);
    U1.D-.16 = (M-0.15);
    U1.D-.15 = (M-0.14);
    U1.D-.14 = (M-0.13);
    U1.D-.13 = (M-0.12);
    U1.D-.12 = (M-0.11);
    U1.D-.11 = (M-0.10);
    U1.D-.10 = (M-0.9);
    U1.D-.9 = (M-0.8);
    U1.D-.8 = (M-0.7);
    U1.D-.7 = (M-0.6);
    U1.D-.6 = (M-0.5);
    U1.D-.5 = (M-0.4);
    U1.D-.4 = (M-0.3);
    U1.D-.3 = (M-0.2);
    U1.D-.2 = (M-0.1);
    U1.D-.1 = (M-0.0);
    U1.D-.0 = (D-);

  /* type converters *********************/

ANNOTATIONS
{
  BUS BUS_TYPE = "DOT";
}

END MODULE;


/* * * * * * *  Contents of NET file CNTD8_DEC8.NET  * * * * * * */

/*****************************************************/
/*  Netlist copyright (C) 1989 LSI Logic Corporation  */
/*****************************************************/
```

```
MODULE CNTD8_DEC8;

INPUTS      A.7,A.6,A.5,A.4,A.3,A.2,A.1,A.0,CIN1,CIN2,CIN3;
OUTPUTS     CON,Y.7,Y.6,Y.5,Y.4,Y.3,Y.2,Y.1,Y.0;

LEVEL FUNCTION;
DEFINE
  /* implicit connectors *******************/

   A-.7 = (A.7);
   A-.6 = (A.6);
   A-.5 = (A.5);
   A-.4 = (A.4);
   A-.3 = (A.3);
   A-.2 = (A.2);
   A-.1 = (A.1);
   A-.0 = (A.0);
   CIN2- = (CIN2);
   CIN3- = (CIN3);
   CIN1- = (CIN1);
   CON- = (CON);
   Y-.7 = (Y.7);
   Y-.6 = (Y.6);
   Y-.5 = (Y.5);
   Y-.4 = (Y.4);
   Y-.3 = (Y.3);
   Y-.2 = (Y.2);
   Y-.1 = (Y.1);
   Y-.0 = (Y.0);


 /* part instances **************************/

   M___13(M___13.Z-=Z) = ENC(M___8.Z-=A,M___13.B-=B);
   M___4(M___4.Z-=Z) = N1B(M___4.A-=A);
   U11(U11.Z-=Z) = EOC(M___1.Z-=A,U11.B-=B);
   U14(U14.Z-=Z) = N1C(M___5.B-=A);
   U0(U0.Z-=Z) = N1C(U6.Z-=A);
   U6(U6.Z-=Z) = OR3C(CIN2-=B,CIN3-=C,CIN1-=A);
   M___5(M___5.Z-=Z) = NR2C(M___5.B-=B,U6.Z-=A);
   M___3(M___3.Z-=Z) = N1C(M___3.A-=A);
   U1(U1.Z-=Z) = N1C(U1.A-=A);
   M___11(M___11.Z-=Z) = ENC(M___6.Z-=A,M___11.B-=B);
   M___6(M___6.Z-=Z) = ND2C(U1.Z-=B,U0.Z-=A);
   M___9(M___9.Z-=Z) = ND4C(M___5.Z-=D,M___4.Z-=C,M___3.Z-=B,U1.Z-=A);
   M___1(M___1.Z-=Z) = N1C(M___9.Z-=A);
   U4(U4.Z-=Z) = N1C(U4.A-=A);
   U3(U3.Z-=Z) = N1C(U3.A-=A);
   U7(U7.Z-=Z) = ND3C(U3.Z-=C,U2.Z-=B,M___1.Z-=A);
   U2(U2.Z-=Z) = N1C(U2.A-=A);
   U13(U13.Z-=Z) = ENC(U8.Z-=A,U13.B-=B);
   U8(U8.Z-=Z) = ND4C(U3.Z-=C,U4.Z-=D,U2.Z-=B,M___1.Z-=A);
   U5(U5.Z-=Z) = ND2C(U2.Z-=B,M___1.Z-=A);
   U10(U10.Z-=Z) = ENC(U5.Z-=A,U10.B-=B);
   U12(U12.Z-=Z) = ENC(U7.Z-=A,U12.B-=B);
   U15(U15.Z-=Z) = N1C(U15.A-=A);
   U9(CON-=Z) = ND8B(M___4.Z-=G,M___3.Z-=F,U14.Z-=H,U1.Z-=E,U4.Z-=C,
           U3.Z-=D,U2.Z-=B,U15.Z-=A);
   M___8(M___8.Z-=Z) = ND4C(U0.Z-=A,U1.Z-=B,M___3.Z-=C,M___4.Z-=D);
   M___7(M___7.Z-=Z) = ND3C(M___3.Z-=C,U1.Z-=B,U0.Z-=A);
   M___12(M___12.Z-=Z) = ENC(M___7.Z-=A,M___12.B-=B);
   M___10(M___10.Z-=Z) = EOC(U0.Z-=A,M___10.B-=B);


 /* extractors *****************************/

   M-3.3 = (M___13.Z-);
   M-2.3 = (M___13.B-);
   M-2.2 = (M___4.A-);
   A-.3 = (M-2.3);
   A-.2 = (M-2.2);
   A-.1 = (M-2.1);
   A-.0 = (M-2.0);
   A-.7 = (M-1.3);
```

```
    A-.6 = (M-1.2);
    A-.5 = (M-1.1);
    A-.4 = (M-1.0);
    Y-.7 = (M-0.3);
    Y-.6 = (M-0.2);
    Y-.5 = (M-0.1);
    Y-.4 = (M-0.0);
    M-0.0 = (U11.Z-);
    M-1.0 = (U11.B-);
    M-2.3 = (M___5.B-);
    M-2.1 = (M___3.A-);
    M-2.0 = (U1.A-);
    M-3.1 = (M___11.Z-);
    M-2.1 = (M___11.B-);
    M-1.2 = (U4.A-);
    M-1.1 = (U3.A-);
    M-1.0 = (U2.A-);
    M-0.3 = (U13.Z-);
    M-1.3 = (U13.B-);
    M-1.1 = (U10.B-);
    M-0.1 = (U10.Z-);
    M-0.2 = (U12.Z-);
    M-1.2 = (U12.B-);
    M-1.3 = (U15.A-);
    M-3.2 = (M___12.Z-);
    M-2.2 = (M___12.B-);
    M-2.0 = (M___10.B-);
    M-3.0 = (M___10.Z-);
    Y-.3 = (M-3.3);
    Y-.2 = (M-3.2);
    Y-.1 = (M-3.1);
    Y-.0 = (M-3.0);

  /* type converters *********************/

ANNOTATIONS
{
  BUS BUS_TYPE = "DOT";
}

END MODULE;


/* * * * * * *  Contents of NET file Y_CNTV3.NET  * * * * * * */

/*********************************************************/
/*  Netlist copyright (C) 1989 LSI Logic Corporation    */
/*********************************************************/


MODULE Y_CNTV3;

INPUTS      CP,CS_,EOR,INC,PDI.15,PDI.14,PDI.13,PDI.12,PDI.11,
            PDI.10,PDI.9,PDI.8,PDI.7,PDI.6,PDI.5,PDI.4,PDI.3,
            PDI.2,PDI.1,PDI.0,RESET_,STRT_FLG,WR_;
OUTPUTS     FIRST_ROW,INROW,LAST,LSTMINUS1,SECOND_ROW;

LEVEL FUNCTION;
DEFINE
  /* implicit connectors *******************/

    EOR- = (EOR);
    FIRST_ROW- = (FIRST_ROW);
    SECOND_ROW- = (SECOND_ROW);
    LSTMINUS1- = (LSTMINUS1);
    INROW- = (INROW);
    INC- = (INC);
    PDI-.15 = (PDI.15);
    PDI-.14 = (PDI.14);
    PDI-.13 = (PDI.13);
    PDI-.12 = (PDI.12);
    PDI-.11 = (PDI.11);
```

```
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    STRT_FLG- = (STRT_FLG);
    WR_- = (WR_);
    CS_- = (CS_);
    CP- = (CP);
    RESET_- = (RESET_);
    LAST- = (LAST);

  /* part instances **************************/

    U10(U10.Z-=Z) = OR3B(STRT_FLG-=A,WR_-=B,CS_-=C);
    U2(U2.CO-=CO) = CNT16D(U7.Q-.15=DI.15,U7.Q-.14=DI.14,U7.Q-.13=DI.13,
            U7.Q-.12=DI.12,U7.Q-.11=DI.11,U7.Q-.10=DI.10,U7.Q-.9=DI.9,
            U7.Q-.8=DI.8,U7.Q-.7=DI.7,U7.Q-.6=DI.6,U7.Q-.5=DI.5,
            U7.Q-.4=DI.4,U7.Q-.3=DI.3,U7.Q-.2=DI.2,U7.Q-.1=DI.1,
            U7.Q-.0=DI.0,U4.CI-=CI,CP-=CP,U4.LD_-=LD_,U1.Z-=RESET_);
    U7.15(U7.Q-.15=Q) = FD2A(PDI-.15=D,U10.Z-=CP,U0.Z-=CD);
    U7.14(U7.Q-.14=Q) = FD2A(PDI-.14=D,U10.Z-=CP,U0.Z-=CD);
    U7.13(U7.Q-.13=Q) = FD2A(PDI-.13=D,U10.Z-=CP,U0.Z-=CD);
    U7.12(U7.Q-.12=Q) = FD2A(PDI-.12=D,U10.Z-=CP,U0.Z-=CD);
    U7.11(U7.Q-.11=Q) = FD2A(PDI-.11=D,U10.Z-=CP,U0.Z-=CD);
    U7.10(U7.Q-.10=Q) = FD2A(PDI-.10=D,U10.Z-=CP,U0.Z-=CD);
    U7.9(U7.Q-.9=Q) = FD2A(PDI-.9=D,U10.Z-=CP,U0.Z-=CD);
    U7.8(U7.Q-.8=Q) = FD2A(PDI-.8=D,U10.Z-=CP,U0.Z-=CD);
    U7.7(U7.Q-.7=Q) = FD2A(PDI-.7=D,U10.Z-=CP,U0.Z-=CD);
    U7.6(U7.Q-.6=Q) = FD2A(PDI-.6=D,U10.Z-=CP,U0.Z-=CD);
    U7.5(U7.Q-.5=Q) = FD2A(PDI-.5=D,U10.Z-=CP,U0.Z-=CD);
    U7.4(U7.Q-.4=Q) = FD2A(PDI-.4=D,U10.Z-=CP,U0.Z-=CD);
    U7.3(U7.Q-.3=Q) = FD2A(PDI-.3=D,U10.Z-=CP,U0.Z-=CD);
    U7.2(U7.Q-.2=Q) = FD2A(PDI-.2=D,U10.Z-=CP,U0.Z-=CD);
    U7.1(U7.Q-.1=Q) = FD2A(PDI-.1=D,U10.Z-=CP,U0.Z-=CD);
    U7.0(U7.Q-.0=Q) = FD2A(PDI-.0=D,U10.Z-=CP,U0.Z-=CD);
    U6(U6.Z-=Z) = N1A(RESET_-=A);
    U0(U0.Z-=Z) = N1A(U6.Z-=A);
    U1(U1.Z-=Z) = AND2C(U10.Z-=A,U0.Z-=B);
    U4(U4.CI-=CI,U4.LD_-=LD_,FIRST_ROW-=FR,SECOND_ROW-=SR,
            LSTMINUS1-=LR_1,LAST-=LR,INROW-=IR) = YSEQV4FN(EOR-=EOR,
            STRT_FLG-=STRT_FLG,CP-=CP,U2.CO-=CO,INC-=INC,U1.Z-=RESET_);

  /* extractors ******************************/


  /* type converters *********************/

ANNOTATIONS
{
  BUS BUS_TYPE = "DOT";
}

END MODULE;


/* * * * * * *  Contents of NET file CNTD8.NET  * * * * * * */

/*******************************************************/
/*  Netlist copyright (C) 1989 LSI Logic Corporation   */
/*******************************************************/


MODULE CNTD8;
```

```
INPUTS      AL,CD,CIN1,CIN2,CIN3,CP0,D.7,D.6,D.5,D.4,D.3,D.2,D.1,
            D.0;
OUTPUTS     CO,Q.7,Q.6,Q.5,Q.4,Q.3,Q.2,Q.1,Q.0;

LEVEL FUNCTION;
DEFINE
  /* implicit connectors *******************/

    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    CIN1- = (CIN1);
    CIN3- = (CIN3);
    CIN2- = (CIN2);
    CO- = (CO);
    CD- = (CD);
    D-.7 = (D.7);
    D-.6 = (D.6);
    D-.5 = (D.5);
    D-.4 = (D.4);
    D-.3 = (D.3);
    D-.2 = (D.2);
    D-.1 = (D.1);
    D-.0 = (D.0);
    AL- = (AL);
    CP0- = (CP0);


  /* part instances **************************/

    M___36(M___36.Z-=Z) = N1C(M___36.A-=A);
    M___38(M___38.Z-=Z) = N1C(M___38.A-=A);
    M___16(M___16.Z-=Z) = ND2C(M___16.B-=B,U1.Z-=A);
    M___14(M___14.Z-=Z) = ND2C(M___14.B-=B,U1.Z-=A);
    U0(CO-=Z) = N1B(M___9.CON-=A);
    M___9(M___9.CON-=CON,M___9.Y-.7=Y.7,M___9.Y-.6=Y.6,M___9.Y-.5=Y.5,
            M___9.Y-.4=Y.4,M___9.Y-.3=Y.3,M___9.Y-.2=Y.2,
            M___9.Y-.1=Y.1,M___9.Y-.0=Y.0) = CNTD8_DEC8(CIN1-=CIN1,
            CIN3-=CIN3,CIN2-=CIN2,M___9.A-.7=A.7,M___9.A-.6=A.6,
            M___9.A-.5=A.5,M___9.A-.4=A.4,M___9.A-.3=A.3,
            M___9.A-.2=A.2,M___9.A-.1=A.1,M___9.A-.0=A.0);
    M___17(M___17.Z-=Z) = ND2C(M___17.B-=B,U1.Z-=A);
    M___41(M___41.Z-=Z) = N1C(M___41.A-=A);
    M___25(M___25.Z-=Z) = ND2C(M___41.Z-=B,U1.Z-=A);
    M___33(M___33.Z-=Z) = AND2C(CD-=A,M___25.Z-=B);
    U6(U6.Z-=Z) = N1B(M___7.QN-=A);
    M___7(M___7.Q-=Q,M___7.QN-=QN) = FD3A(M___7.D-=D,M___17.Z-=SD,
            M___33.Z-=CD,U2.Z-=CP);
    M___15(M___15.Z-=Z) = ND2C(M___15.B-=B,U1.Z-=A);
    M___39(M___39.Z-=Z) = N1C(M___39.A-=A);
    M___23(M___23.Z-=Z) = ND2C(M___39.Z-=B,U1.Z-=A);
    M___31(M___31.Z-=Z) = AND2C(CD-=A,M___23.Z-=B);
    U8(U8.Z-=Z) = N1B(M___5.QN-=A);
    M___5(M___5.Q-=Q,M___5.QN-=QN) = FD3A(M___5.D-=D,M___15.Z-=SD,
            M___31.Z-=CD,U2.Z-=CP);
    M___18(M___18.Z-=Z) = ND2C(M___18.B-=B,U1.Z-=A);
    M___42(M___42.Z-=Z) = N1C(M___42.A-=A);
    M___26(M___26.Z-=Z) = ND2C(M___42.Z-=B,U1.Z-=A);
    M___34(M___34.Z-=Z) = AND2C(CD-=A,M___26.Z-=B);
    U5(U5.Z-=Z) = N1B(M___8.QN-=A);
    M___8(M___8.Q-=Q,M___8.QN-=QN) = FD3A(M___8.D-=D,M___18.Z-=SD,
            M___34.Z-=CD,U2.Z-=CP);
    M___13(M___13.Z-=Z) = ND2C(M___13.B-=B,U1.Z-=A);
    U10(U10.Z-=Z) = N1B(M___3.QN-=A);
    M___3(M___3.Q-=Q,M___3.QN-=QN) = FD3A(M___3.D-=D,M___13.Z-=SD,
            M___29.Z-=CD,U2.Z-=CP);
    M___37(M___37.Z-=Z) = N1C(M___37.A-=A);
    M___21(M___21.Z-=Z) = ND2C(M___37.Z-=B,U1.Z-=A);
```

```
M___29(M___29.Z-=Z) = AND2C(CD-=A,M___21.Z-=B);
M___40(M___40.Z-=Z) = N1C(M___40.A-=A);
M___24(M___24.Z-=Z) = ND2C(M___40.Z-=B,U1.Z-=A);
M___32(M___32.Z-=Z) = AND2C(CD-=A,M___24.Z-=B);
M___35(M___35.Z-=Z) = N1C(M___35.A-=A);
M___19(M___19.Z-=Z) = ND2C(M___35.Z-=B,U1.Z-=A);
M___27(M___27.Z-=Z) = AND2C(CD-=A,M___19.Z-=B);
U12(U12.Z-=Z) = N1B(M___1.QN-=A);
M___1(M___1.Q-=Q,M___1.QN-=QN) = FD3A(M___11.Z-=SD,M___1.D-=D,
        M___27.Z-=CD,U2.Z-=CP);
M___11(M___11.Z-=Z) = ND2C(M___11.B-=B,U1.Z-=A);
M___12(M___12.Z-=Z) = ND2C(M___12.B-=B,U1.Z-=A);
U11(U11.Z-=Z) = N1B(M___2.QN-=A);
M___2(M___2.Q-=Q,M___2.QN-=QN) = FD3A(M___2.D-=D,M___12.Z-=SD,
        M___28.Z-=CD,U2.Z-=CP);
M___28(M___28.Z-=Z) = AND2C(CD-=A,M___20.Z-=B);
M___20(M___20.Z-=Z) = ND2C(M___36.Z-=B,U1.Z-=A);
U1(U1.Z-=Z) = N1C(AL-=A);
M___22(M___22.Z-=Z) = ND2C(M___38.Z-=B,U1.Z-=A);
M___30(M___30.Z-=Z) = AND2C(CD-=A,M___22.Z-=B);
M___4(M___4.Q-=Q,M___4.QN-=QN) = FD3A(M___4.D-=D,M___14.Z-=SD,
        M___30.Z-=CD,U2.Z-=CP);
U9(U9.Z-=Z) = N1B(M___4.QN-=A);
U7(U7.Z-=Z) = N1B(M___6.QN-=A);
M___6(M___6.Q-=Q,M___6.QN-=QN) = FD3A(M___6.D-=D,M___16.Z-=SD,
        M___32.Z-=CD,U2.Z-=CP);
U2(U2.Z-=Z) = N1E(U3.Z-=A);
U3(U3.Z-=Z) = N1C(CP0-=A);


/* extractors ******************************/


D-.1 = (M___36.A-);
D-.3 = (M___38.A-);
D-.5 = (M___16.B-);
D-.3 = (M___14.B-);
M___9.Y-.0 = (M___1.D-);
M___9.Y-.1 = (M___2.D-);
M___9.Y-.3 = (M___4.D-);
M___9.A-.1 = (M___2.Q-);
M___9.A-.0 = (M___1.Q-);
M___9.Y-.6 = (M___7.D-);
D-.6 = (M___17.B-);
D-.6 = (M___41.A-);
Q-.6 = (U6.Z-);
M___9.A-.6 = (M___7.Q-);
M___9.A-.3 = (M___4.Q-);
M___9.A-.5 = (M___6.Q-);
M___9.A-.2 = (M___3.Q-);
M___9.Y-.4 = (M___5.D-);
D-.4 = (M___15.B-);
D-.4 = (M___39.A-);
Q-.4 = (U8.Z-);
M___9.A-.4 = (M___5.Q-);
M___9.A-.7 = (M___8.Q-);
D-.7 = (M___18.B-);
D-.7 = (M___42.A-);
Q-.7 = (U5.Z-);
M___9.Y-.7 = (M___8.D-);
M___9.Y-.5 = (M___6.D-);
M___9.Y-.2 = (M___3.D-);
D-.2 = (M___13.B-);
Q-.2 = (U10.Z-);
D-.2 = (M___37.A-);
D-.5 = (M___40.A-);
D-.0 = (M___35.A-);
Q-.0 = (U12.Z-);
D-.0 = (M___11.B-);
D-.1 = (M___12.B-);
Q-.1 = (U11.Z-);
Q-.3 = (U9.Z-);
Q-.5 = (U7.Z-);
```

```
  /* type converters ********************/

ANNOTATIONS
{
  BUS BUS_TYPE = "DOT";
}

END MODULE;


/* * * * * * *  Contents of NET file CNT16D.NET  * * * * * * */

/*****************************************************/
/*  Netlist copyright (C) 1989 LSI Logic Corporation  */
/*****************************************************/


MODULE CNT16D;

INPUTS      CI,CP,DI.15,DI.14,DI.13,DI.12,DI.11,DI.10,DI.9,DI.8,
            DI.7,DI.6,DI.5,DI.4,DI.3,DI.2,DI.1,DI.0,LD_,RESET_;
OUTPUTS     CO,Q.15,Q.14,Q.13,Q.12,Q.11,Q.10,Q.9,Q.8,Q.7,Q.6,Q.5,
            Q.4,Q.3,Q.2,Q.1,Q.0;

LEVEL FUNCTION;
DEFINE
  /* implicit connectors ******************/

    CO- = (CO);
    CP- = (CP);
    Q-.15 = (Q.15);
    Q-.14 = (Q.14);
    Q-.13 = (Q.13);
    Q-.12 = (Q.12);
    Q-.11 = (Q.11);
    Q-.10 = (Q.10);
    Q-.9 = (Q.9);
    Q-.8 = (Q.8);
    Q-.7 = (Q.7);
    Q-.6 = (Q.6);
    Q-.5 = (Q.5);
    Q-.4 = (Q.4);
    Q-.3 = (Q.3);
    Q-.2 = (Q.2);
    Q-.1 = (Q.1);
    Q-.0 = (Q.0);
    LD_- = (LD_);
    DI-.15 = (DI.15);
    DI-.14 = (DI.14);
    DI-.13 = (DI.13);
    DI-.12 = (DI.12);
    DI-.11 = (DI.11);
    DI-.10 = (DI.10);
    DI-.9 = (DI.9);
    DI-.8 = (DI.8);
    DI-.7 = (DI.7);
    DI-.6 = (DI.6);
    DI-.5 = (DI.5);
    DI-.4 = (DI.4);
    DI-.3 = (DI.3);
    DI-.2 = (DI.2);
    DI-.1 = (DI.1);
    DI-.0 = (DI.0);
    CI- = (CI);
    CI- = (CI);
    BRESET_- = (BRESET_);
    BRESET_- = (BRESET_);
    RESET_- = (RESET_);


  /* part instances *************************/

    U0(U0.Q-.7=Q.7,U0.Q-.6=Q.6,U0.Q-.5=Q.5,U0.Q-.4=Q.4,U0.Q-.3=Q.3,
```

```
        U0.Q-.2=Q.2,U0.Q-.1=Q.1,U0.Q-.0=Q.0,U0.CO-=CO) = CNTD8(
        CP-=CP0,U2.Z-=CIN2,U2.Z-=CIN3,BRESET_-=CD,LD_-=AL,
        U0.D-.7=D.7,U0.D-.6=D.6,U0.D-.5=D.5,U0.D-.4=D.4,
        U0.D-.3=D.3,U0.D-.2=D.2,U0.D-.1=D.1,U0.D-.0=D.0,U2.Z-=CIN1);
  U4(CO-=Z) = AND3B(U1.CO-=B,CI-=C,U0.CO-=A);
  U7(U7.Z-=Z) = N1B(CI-=A);
  U2(U2.Z-=Z) = ND2B(U1.CO-=A,CI-=B);
  U1(U1.Q-.7=Q.7,U1.Q-.6=Q.6,U1.Q-.5=Q.5,U1.Q-.4=Q.4,U1.Q-.3=Q.3,
        U1.Q-.2=Q.2,U1.Q-.1=Q.1,U1.Q-.0=Q.0,U1.CO-=CO) = CNTD8(
        CP-=CP0,U7.Z-=CIN2,U7.Z-=CIN3,U7.Z-=CIN1,LD_-=AL,
        BRESET_-=CD,U1.D-.7=D.7,U1.D-.6=D.6,U1.D-.5=D.5,
        U1.D-.4=D.4,U1.D-.3=D.3,U1.D-.2=D.2,U1.D-.1=D.1,
        U1.D-.0=D.0);
  U5(BRESET_-=Z) = N1C(U6.Z-=A);
  U6(U6.Z-=Z) = N1A(RESET_-=A);

 /* extractors *****************************/

  Q-.7 = (U1.Q-.7);
  Q-.6 = (U1.Q-.6);
  Q-.5 = (U1.Q-.5);
  Q-.4 = (U1.Q-.4);
  Q-.3 = (U1.Q-.3);
  Q-.2 = (U1.Q-.2);
  Q-.1 = (U1.Q-.1);
  Q-.0 = (U1.Q-.0);
  Q-.15 = (U0.Q-.7);
  Q-.14 = (U0.Q-.6);
  Q-.13 = (U0.Q-.5);
  Q-.12 = (U0.Q-.4);
  Q-.11 = (U0.Q-.3);
  Q-.10 = (U0.Q-.2);
  Q-.9 = (U0.Q-.1);
  Q-.8 = (U0.Q-.0);
  DI-.7 = (U1.D-.7);
  DI-.6 = (U1.D-.6);
  DI-.5 = (U1.D-.5);
  DI-.4 = (U1.D-.4);
  DI-.3 = (U1.D-.3);
  DI-.2 = (U1.D-.2);
  DI-.1 = (U1.D-.1);
  DI-.0 = (U1.D-.0);
  DI-.15 = (U0.D-.7);
  DI-.14 = (U0.D-.6);
  DI-.13 = (U0.D-.5);
  DI-.12 = (U0.D-.4);
  DI-.11 = (U0.D-.3);
  DI-.10 = (U0.D-.2);
  DI-.9 = (U0.D-.1);
  DI-.8 = (U0.D-.0);

 /* type converters ********************/

ANNOTATIONS
{
  BUS BUS_TYPE = "DOT";
}

END MODULE;


/* * * * * * *  Contents of NET file RSTDECV1.NET  * * * * * * */

/******************************************************/
/*  Netlist copyright (C) 1989 LSI Logic Corporation  */
/******************************************************/


MODULE RSTDECV1;

INPUTS       DLY_POL,NOS0,NOS1,RESET_;
OUTPUTS      RST0,RST1,RST2,RST3;
```

```
LEVEL FUNCTION;
DEFINE
  /* implicit connectors ******************/

    RST2- = (RST2);
    RST3- = (RST3);
    RST1- = (RST1);
    NOS1- = (NOS1);
    RST0- = (RST0);
    DLY_POL- = (DLY_POL);
    RESET_- = (RESET_);
    NOS0- = (NOS0);


  /* part instances ************************/

    M10(RST3-=Z) = N1B(M6.Z-=A);
    M9(RST0-=Z) = ND3B(M6.Z-=C,M4.Z-=A,M5.Z-=B);
    M5(M5.Z-=Z) = ND2B(NOS0-=B,RESET_-=A);
    M6(M6.Z-=Z) = ND2C(DLY_POL-=B,RESET_-=A);
    M4(M4.Z-=Z) = ND2B(NOS1-=B,RESET_-=A);
    M8(RST1-=Z) = ND2B(M6.Z-=B,M4.Z-=A);
    M7(RST2-=Z) = ND2B(M6.Z-=B,M3.Z-=A);
    M3(M3.Z-=Z) = ND3B(NOS0-=C,NOS1-=B,RESET_-=A);


  /* extractors ****************************/


  /* type converters ********************/

ANNOTATIONS
{
  BUS BUS_TYPE = "DOT";
}

END MODULE;



/* * * * * * *  Contents of NET file SEDLYCNT.NET  * * * * * * */

/*****************************************************/
/*  Netlist copyright (C) 1989 LSI Logic Corporation  */
/*****************************************************/


MODULE SEDLYCNT;

INPUTS      DLY_POL,NOS.1,NOS.0,RESET_;
OUTPUTS     RST_.23,RST_.22,RST_.21,RST_.20,RST_.19,RST_.18,
            RST_.17,RST_.16,RST_.15,RST_.14,RST_.13,RST_.12,
            RST_.11,RST_.10,RST_.9,RST_.8,RST_.7,RST_.6,RST_.5,
            RST_.4,RST_.3,RST_.2,RST_.1,RST_.0;

LEVEL FUNCTION;
DEFINE
  /* implicit connectors ******************/

    RESET_- = (RESET_);
    RST_-.23 = (RST_.23);
    RST_-.22 = (RST_.22);
    RST_-.21 = (RST_.21);
    RST_-.20 = (RST_.20);
    RST_-.19 = (RST_.19);
    RST_-.18 = (RST_.18);
    RST_-.17 = (RST_.17);
    RST_-.16 = (RST_.16);
    RST_-.15 = (RST_.15);
    RST_-.14 = (RST_.14);
    RST_-.13 = (RST_.13);
    RST_-.12 = (RST_.12);
    RST_-.11 = (RST_.11);
```

```
     RST_-.10 = (RST_.10);
     RST_-.9 = (RST_.9);
     RST_-.8 = (RST_.8);
     RST_-.7 = (RST_.7);
     RST_-.6 = (RST_.6);
     RST_-.5 = (RST_.5);
     RST_-.4 = (RST_.4);
     RST_-.3 = (RST_.3);
     RST_-.2 = (RST_.2);
     RST_-.1 = (RST_.1);
     RST_-.0 = (RST_.0);
     DLY_POL- = (DLY_POL);
     NOS-.1 = (NOS.1);
     NOS-.0 = (NOS.0);

   /* part instances **************************/

     U0(U0.RST3-=RST3,U0.RST2-=RST2,U0.RST1-=RST1,U0.RST0-=RST0) =
             RSTDECV1(RESET_-=RESET_,U0.NOS0-=NOS0,U0.NOS1-=NOS1,
             DLY_POL-=DLY_POL);

   /* extractors ******************************/

     RST_-.2 = (RESET_-);
     RST_-.12 = (RESET_-);
     RST_-.5 = (U0.RST0-);
     RST_-.3 = (RESET_-);
     RST_-.4 = (RESET_-);
     RST_-.1 = (RESET_-);
     RST_-.0 = (RESET_-);
     RST_-.7 = (RESET_-);
     RST_-.19 = (RESET_-);
     RST_-.13 = (RESET_-);
     RST_-.9 = (RESET_-);
     RST_-.10 = (U0.RST1-);
     RST_-.11 = (U0.RST1-);
     RST_-.8 = (RESET_-);
     RST_-.20 = (U0.RST3-);
     RST_-.23 = (U0.RST3-);
     RST_-.21 = (U0.RST3-);
     RST_-.22 = (U0.RST3-);
     RST_-.6 = (RESET_-);
     RST_-.16 = (U0.RST2-);
     RST_-.17 = (U0.RST2-);
     RST_-.15 = (U0.RST2-);
     RST_-.14 = (RESET_-);
     RST_-.18 = (RESET_-);
     NOS-.0 = (U0.NOS0-);
     NOS-.1 = (U0.NOS1-);

   /* type converters *********************/

ANNOTATIONS
{
  BUS BUS_TYPE = "DOT";
}

END MODULE;


/* * * * * * *  Contents of NET file DUPDLY.NET  * * * * * * */

/*******************************************************/
/*  Netlist copyright (C) 1989 LSI Logic Corporation   */
/*******************************************************/


MODULE DUPDLY;

INPUTS       CP,D,DLY_POL,NOS.1,NOS.0,RESET_,WAIT;
OUTPUTS      DUP;
```

```
LEVEL FUNCTION;
DEFINE
  /* implicit connectors ******************/

    DUP- = (DUP);
    WAIT- = (WAIT);
    D- = (D);
    CP- = (CP);
    RESET_- = (RESET_);
    DLY_POL- = (DLY_POL);
    NOS-.1 = (NOS.1);
    NOS-.0 = (NOS.0);


  /* part instances *************************/

    U2(U2.Z-=Z) = B3A(WAIT-=A);
    U1.23(U1.Q-.23=Q) = FD2SA(U2.Z-=TE,U1.D-.23=D,U1.Q-.23=TI,CP-=CP,
            RESET_-=CD);
    U1.22(U1.Q-.22=Q) = FD2SA(U2.Z-=TE,U1.D-.22=D,U1.Q-.22=TI,CP-=CP,
            RESET_-=CD);
    U1.21(U1.Q-.21=Q) = FD2SA(U2.Z-=TE,U1.D-.21=D,U1.Q-.21=TI,CP-=CP,
            RESET_-=CD);
    U1.20(U1.Q-.20=Q) = FD2SA(U2.Z-=TE,U1.D-.20=D,U1.Q-.20=TI,CP-=CP,
            RESET_-=CD);
    U1.19(U1.Q-.19=Q) = FD2SA(U2.Z-=TE,U1.D-.19=D,U1.Q-.19=TI,CP-=CP,
            RESET_-=CD);
    U1.18(U1.Q-.18=Q) = FD2SA(U2.Z-=TE,U1.D-.18=D,U1.Q-.18=TI,CP-=CP,
            RESET_-=CD);
    U1.17(U1.Q-.17=Q) = FD2SA(U2.Z-=TE,U1.D-.17=D,U1.Q-.17=TI,CP-=CP,
            RESET_-=CD);
    U1.16(U1.Q-.16=Q) = FD2SA(U2.Z-=TE,U1.D-.16=D,U1.Q-.16=TI,CP-=CP,
            RESET_-=CD);
    U1.15(U1.Q-.15=Q) = FD2SA(U2.Z-=TE,U1.D-.15=D,U1.Q-.15=TI,CP-=CP,
            RESET_-=CD);
    U1.14(U1.Q-.14=Q) = FD2SA(U2.Z-=TE,U1.D-.14=D,U1.Q-.14=TI,CP-=CP,
            RESET_-=CD);
    U1.13(U1.Q-.13=Q) = FD2SA(U2.Z-=TE,U1.D-.13=D,U1.Q-.13=TI,CP-=CP,
            RESET_-=CD);
    U1.12(U1.Q-.12=Q) = FD2SA(U2.Z-=TE,U1.D-.12=D,U1.Q-.12=TI,CP-=CP,
            RESET_-=CD);
    U1.11(U1.Q-.11=Q) = FD2SA(U2.Z-=TE,U1.D-.11=D,U1.Q-.11=TI,CP-=CP,
            RESET_-=CD);
    U1.10(U1.Q-.10=Q) = FD2SA(U2.Z-=TE,U1.D-.10=D,U1.Q-.10=TI,CP-=CP,
            RESET_-=CD);
    U1.9(U1.Q-.9=Q) = FD2SA(U2.Z-=TE,U1.D-.9=D,U1.Q-.9=TI,CP-=CP,
            RESET_-=CD);
    U1.8(U1.Q-.8=Q) = FD2SA(U2.Z-=TE,U1.D-.8=D,U1.Q-.8=TI,CP-=CP,
            RESET_-=CD);
    U1.7(U1.Q-.7=Q) = FD2SA(U2.Z-=TE,U1.D-.7=D,U1.Q-.7=TI,CP-=CP,
            RESET_-=CD);
    U1.6(U1.Q-.6=Q) = FD2SA(U2.Z-=TE,U1.D-.6=D,U1.Q-.6=TI,CP-=CP,
            RESET_-=CD);
    U1.5(U1.Q-.5=Q) = FD2SA(U2.Z-=TE,U1.D-.5=D,U1.Q-.5=TI,CP-=CP,
            RESET_-=CD);
    U1.4(U1.Q-.4=Q) = FD2SA(U2.Z-=TE,U1.D-.4=D,U1.Q-.4=TI,CP-=CP,
            RESET_-=CD);
    U1.3(U1.Q-.3=Q) = FD2SA(U2.Z-=TE,U1.D-.3=D,U1.Q-.3=TI,CP-=CP,
            RESET_-=CD);
    U1.2(U1.Q-.2=Q) = FD2SA(U2.Z-=TE,U1.D-.2=D,U1.Q-.2=TI,CP-=CP,
            RESET_-=CD);
    U1.1(U1.Q-.1=Q) = FD2SA(U2.Z-=TE,U1.D-.1=D,U1.Q-.1=TI,CP-=CP,
            RESET_-=CD);
    U1.0(U1.Q-.0=Q) = FD2SA(U2.Z-=TE,U1.D-.0=D,U1.Q-.0=TI,CP-=CP,
            RESET_-=CD);
    U0(DUP-=Z) = MUX81HB(U0.D0-=D0,U0.D1-=D1,U0.D2-=D2,U0.D3-=D3,
            U0.D4-=D4,U0.D5-=D5,U0.D6-=D6,U0.D7-=D7,U0.B-=B,U0.C-=C,
            DLY_POL-=A);


  /* extractors *****************************/

    U1.Q-.14 = (U0.D4-);
    U1.Q-.11 = (U0.D3-);
```

```
    U1.Q-.4 = (U0.D0-);
    U1.Q-.5 = (U0.D1-);
    U1.Q-.19 = (U0.D6-);
    U1.Q-.9 = (U0.D2-);
    U1.Q-.17 = (U0.D5-);
    U1.Q-.22 = (M-0.22);
    U1.Q-.21 = (M-0.21);
    U1.Q-.20 = (M-0.20);
    U1.Q-.19 = (M-0.19);
    U1.Q-.18 = (M-0.18);
    U1.Q-.17 = (M-0.17);
    U1.Q-.16 = (M-0.16);
    U1.Q-.15 = (M-0.15);
    U1.Q-.14 = (M-0.14);
    U1.Q-.13 = (M-0.13);
    U1.Q-.12 = (M-0.12);
    U1.Q-.11 = (M-0.11);
    U1.Q-.10 = (M-0.10);
    U1.Q-.9 = (M-0.9);
    U1.Q-.8 = (M-0.8);
    U1.Q-.7 = (M-0.7);
    U1.Q-.6 = (M-0.6);
    U1.Q-.5 = (M-0.5);
    U1.Q-.4 = (M-0.4);
    U1.Q-.3 = (M-0.3);
    U1.Q-.2 = (M-0.2);
    U1.Q-.1 = (M-0.1);
    U1.Q-.0 = (M-0.0);
    U1.D-.23 = (M-0.22);
    U1.D-.22 = (M-0.21);
    U1.D-.21 = (M-0.20);
    U1.D-.20 = (M-0.19);
    U1.D-.19 = (M-0.18);
    U1.D-.18 = (M-0.17);
    U1.D-.17 = (M-0.16);
    U1.D-.16 = (M-0.15);
    U1.D-.15 = (M-0.14);
    U1.D-.14 = (M-0.13);
    U1.D-.13 = (M-0.12);
    U1.D-.12 = (M-0.11);
    U1.D-.11 = (M-0.10);
    U1.D-.10 = (M-0.9);
    U1.D-.9 = (M-0.8);
    U1.D-.8 = (M-0.7);
    U1.D-.7 = (M-0.6);
    U1.D-.6 = (M-0.5);
    U1.D-.5 = (M-0.4);
    U1.D-.4 = (M-0.3);
    U1.D-.3 = (M-0.2);
    U1.D-.2 = (M-0.1);
    U1.D-.1 = (M-0.0);
    U1.D-.0 = (D-);
    U1.Q-.23 = (U0.D7-);
    NOS-.0 = (U0.B-);
    NOS-.1 = (U0.C-);

  /* type converters *********************/

ANNOTATIONS
{
  BUS BUS_TYPE = "DOT";
}

END MODULE;


/* * * * * * *  Contents of NET file SEDLYV1.NET  * * * * * * */

/*****************************************************/
/*  Netlist copyright (C) 1989 LSI Logic Corporation  */
/*****************************************************/
```

```
    U3.Q-.17 = (U1.D5-);
    U3.Q-.19 = (U1.D6-);
    U3.Q-.23 = (U1.D7-);
    NOS-.1 = (U0.C-);
    NOS-.0 = (U1.B-);
    U8.D-.0 = (PXL_EN-);
    U8.D-.5 = (M-1.4);
    U8.D-.4 = (M-1.3);
    U8.D-.3 = (M-1.2);
    U8.D-.2 = (M-1.1);
    U8.D-.1 = (M-1.0);
    U8.Q-.4 = (M-1.4);
    U8.Q-.3 = (M-1.3);
    U8.Q-.2 = (M-1.2);
    U8.Q-.1 = (M-1.1);
    U8.Q-.0 = (M-1.0);
    U8.Q-.5 = (U5.B-);
    U3.D-.0 = (D-);
    U3.D-.23 = (M-2.22);
    U3.D-.22 = (M-2.21);
    U3.D-.21 = (M-2.20);
    U3.D-.20 = (M-2.19);
    U3.D-.19 = (M-2.18);
    U3.D-.18 = (M-2.17);
    U3.D-.17 = (M-2.16);
    U3.D-.16 = (M-2.15);
    U3.D-.15 = (M-2.14);
    U3.D-.14 = (M-2.13);
    U3.D-.13 = (M-2.12);
    U3.D-.12 = (M-2.11);
    U3.D-.11 = (M-2.10);
    U3.D-.10 = (M-2.9);
    U3.D-.9 = (M-2.8);
    U3.D-.8 = (M-2.7);
    U3.D-.7 = (M-2.6);
    U3.D-.6 = (M-2.5);
    U3.D-.5 = (M-2.4);
    U3.D-.4 = (M-2.3);
    U3.D-.3 = (M-2.2);
    U3.D-.2 = (M-2.1);
    U3.D-.1 = (M-2.0);
    U3.Q-.22 = (M-2.22);
    U3.Q-.21 = (M-2.21);
    U3.Q-.20 = (M-2.20);
    U3.Q-.19 = (M-2.19);
    U3.Q-.18 = (M-2.18);
    U3.Q-.17 = (M-2.17);
    U3.Q-.16 = (M-2.16);
    U3.Q-.15 = (M-2.15);
    U3.Q-.14 = (M-2.14);
    U3.Q-.13 = (M-2.13);
    U3.Q-.12 = (M-2.12);
    U3.Q-.11 = (M-2.11);
    U3.Q-.10 = (M-2.10);
    U3.Q-.9 = (M-2.9);
    U3.Q-.8 = (M-2.8);
    U3.Q-.7 = (M-2.7);
    U3.Q-.6 = (M-2.6);
    U3.Q-.5 = (M-2.5);
    U3.Q-.4 = (M-2.4);
    U3.Q-.3 = (M-2.3);
    U3.Q-.2 = (M-2.2);
    U3.Q-.1 = (M-2.1);
    U3.Q-.0 = (M-2.0);
    U3.Q-.3 = (U0.D0-);


  /* type converters *********************/

ANNOTATIONS
{
  BUS BUS_TYPE = "DOT";
}

END MODULE;
```

```
/* * * * * * *  Contents of NET file XSEQV5CR.NET  * * * * * * */

/*******************************************************/
/*  Netlist copyright (C) 1989 LSI Logic Corporation   */
/*******************************************************/


MODULE XSEQV5CR;

INPUTS       CO,DLY_POL,INC,RDY,SPRCYC,STBIT0I,STBIT1I,STBIT2I,
             STBIT3I,STBIT4I,STRT_FLG,WAIT;
OUTPUTS      CI,CLRSPR,CLRXAU,CNVEN,DUP,ENSPR,ENXAU,EOC,FC,LC,LC_1,
             LD_,REQ,SC,SE,STBEN,STBIT0O,STBIT1O,STBIT2O,STBIT3O,
             STBIT4O,YADRSEL,YINCEN;

LEVEL FUNCTION;
DEFINE
  /* implicit connectors *******************/

    CNVEN- = (CNVEN);
    LD_- = (LD_);
    STBIT3I- = (STBIT3I);
    YADRSEL- = (YADRSEL);
    CI- = (CI);
    STBIT1I- = (STBIT1I);
    STBIT4I- = (STBIT4I);
    STRT_FLG- = (STRT_FLG);
    LC- = (LC);
    DUP- = (DUP);
    CLRSPR- = (CLRSPR);
    RDY- = (RDY);
    STBIT4O- = (STBIT4O);
    STBIT0O- = (STBIT0O);
    ENXAU- = (ENXAU);
    STBIT2O- = (STBIT2O);
    WAIT- = (WAIT);
    STBIT2I- = (STBIT2I);
    STBIT0I- = (STBIT0I);
    YINCEN- = (YINCEN);
    CLRXAU- = (CLRXAU);
    EOC- = (EOC);
    REQ- = (REQ);
    SC- = (SC);
    FC- = (FC);
    SPRCYC- = (SPRCYC);
    INC- = (INC);
    SE- = (SE);
    LC_1- = (LC_1);
    ENSPR- = (ENSPR);
    CO- = (CO);
    STBEN- = (STBEN);
    STBIT1O- = (STBIT1O);
    DLY_POL- = (DLY_POL);
    STBIT3O- = (STBIT3O);


 /* part instances ***************************/

   M9(M9.Z-=Z) = N1D(STBIT3I-=A);
   M24(M24.Z-=Z) = N1D(STBIT1I-=A);
   M15(M15.Z-=Z) = N1D(STBIT4I-=A);
   M630(M630.Z-=Z) = N1D(M15.Z-=A);
   M40(M40.Z-=Z) = N1C(STRT_FLG-=A);
   M697(LC-=Z) = N1B(M45.Z-=A);
   M658(M658.Z-=Z) = AND3B(M113.Z-=B,M119.Z-=C,M103.Z-=A);
   M629(M629.Z-=Z) = N1D(M9.Z-=A);
   M633(M633.Z-=Z) = N1D(M85.Z-=A);
   M85(M85.Z-=Z) = ND2C(M629.Z-=A,M630.Z-=B);
   M20(M20.Z-=Z) = AND2C(M629.Z-=A,M15.Z-=B);
   M193(M193.Z-=Z) = AND3B(M24.Z-=A,M629.Z-=B,M15.Z-=C);
   M110(M110.Z-=Z) = ND2B(M24.Z-=A,M623.Z-=B);
   M112(M112.Z-=Z) = NR2C(M111.Z-=B,M110.Z-=A);
   M111(M111.Z-=Z) = ND2B(M629.Z-=A,M630.Z-=B);
   M22(M22.Z-=Z) = N1C(RDY-=A);
```

```
MODULE SEDLYV1;

INPUTS      CP,D,DLY_POL,NOS.1,NOS.0,PXL_EN,RESET_,WAIT;
OUTPUTS     CNV,PSE,SE;

LEVEL FUNCTION;
DEFINE
  /* implicit connectors *******************/

    CP- = (CP);
    WAIT- = (WAIT);
    CNV- = (CNV);
    SE- = (SE);
    DLY_POL- = (DLY_POL);
    DLY_POL- = (DLY_POL);
    NOS-.1 = (NOS.1);
    NOS-.0 = (NOS.0);
    NOS-.1 = (NOS.1);
    NOS-.0 = (NOS.0);
    RESET_- = (RESET_);
    RESET_- = (RESET_);
    RESET_- = (RESET_);
    CP- = (CP);
    CP- = (CP);
    WAIT- = (WAIT);
    WAIT- = (WAIT);
    PXL_EN- = (PXL_EN);
    D- = (D);
    D- = (D);
    PSE- = (PSE);


  /* part instances **************************/

    U1(SE-=Z) = MUX81HB(U1.D0-=D0,U1.D1-=D1,U1.D2-=D2,U1.D3-=D3,
            U1.D4-=D4,U1.D5-=D5,U1.D6-=D6,U1.D7-=D7,U1.B-=B,U0.C-=C,
            DLY_POL-=A);
    U2(U2.RST_-.23=RST_.23,U2.RST_-.22=RST_.22,U2.RST_-.21=RST_.21,
            U2.RST_-.20=RST_.20,U2.RST_-.19=RST_.19,U2.RST_-.18=RST_.18,
            U2.RST_-.17=RST_.17,U2.RST_-.16=RST_.16,U2.RST_-.15=RST_.15,
            U2.RST_-.14=RST_.14,U2.RST_-.13=RST_.13,U2.RST_-.12=RST_.12,
            U2.RST_-.11=RST_.11,U2.RST_-.10=RST_.10,U2.RST_-.9=RST_.9,
            U2.RST_-.8=RST_.8,U2.RST_-.7=RST_.7,U2.RST_-.6=RST_.6,
            U2.RST_-.5=RST_.5,U2.RST_-.4=RST_.4,U2.RST_-.3=RST_.3,
            U2.RST_-.2=RST_.2,U2.RST_-.1=RST_.1,U2.RST_-.0=RST_.0)
             = SEDLYCNT(DLY_POL-=DLY_POL,NOS-.1=NOS.1,NOS-.0=NOS.0,
            RESET_-=RESET_);
    U4.4(U4.Q-.4=Q) = FD2SA(WAIT-=TE,CP-=CP,U4.Q-.4=TI,U4.D-.4=D,
            RESET_-=CD);
    U4.3(U4.Q-.3=Q) = FD2SA(WAIT-=TE,CP-=CP,U4.Q-.3=TI,U4.D-.3=D,
            RESET_-=CD);
    U4.2(U4.Q-.2=Q) = FD2SA(WAIT-=TE,CP-=CP,U4.Q-.2=TI,U4.D-.2=D,
            RESET_-=CD);
    U4.1(U4.Q-.1=Q) = FD2SA(WAIT-=TE,CP-=CP,U4.Q-.1=TI,U4.D-.1=D,
            RESET_-=CD);
    U4.0(U4.Q-.0=Q) = FD2SA(WAIT-=TE,CP-=CP,U4.Q-.0=TI,U4.D-.0=D,
            RESET_-=CD);
    U3.23(U3.Q-.23=Q) = FD2SA(U2.RST_-.23=CD,U3.D-.23=D,U3.Q-.23=TI,
            CP-=CP,U7.Z-=TE);
    U3.22(U3.Q-.22=Q) = FD2SA(U2.RST_-.22=CD,U3.D-.22=D,U3.Q-.22=TI,
            CP-=CP,U7.Z-=TE);
    U3.21(U3.Q-.21=Q) = FD2SA(U2.RST_-.21=CD,U3.D-.21=D,U3.Q-.21=TI,
            CP-=CP,U7.Z-=TE);
    U3.20(U3.Q-.20=Q) = FD2SA(U2.RST_-.20=CD,U3.D-.20=D,U3.Q-.20=TI,
            CP-=CP,U7.Z-=TE);
    U3.19(U3.Q-.19=Q) = FD2SA(U2.RST_-.19=CD,U3.D-.19=D,U3.Q-.19=TI,
            CP-=CP,U7.Z-=TE);
    U3.18(U3.Q-.18=Q) = FD2SA(U2.RST_-.18=CD,U3.D-.18=D,U3.Q-.18=TI,
            CP-=CP,U7.Z-=TE);
    U3.17(U3.Q-.17=Q) = FD2SA(U2.RST_-.17=CD,U3.D-.17=D,U3.Q-.17=TI,
            CP-=CP,U7.Z-=TE);
    U3.16(U3.Q-.16=Q) = FD2SA(U2.RST_-.16=CD,U3.D-.16=D,U3.Q-.16=TI,
            CP-=CP,U7.Z-=TE);
    U3.15(U3.Q-.15=Q) = FD2SA(U2.RST_-.15=CD,U3.D-.15=D,U3.Q-.15=TI,
            CP-=CP,U7.Z-=TE);
```

```
U3.14(U3.Q-.14=Q) = FD2SA(U2.RST_-.14=CD,U3.D-.14=D,U3.Q-.14=TI,
         CP-=CP,U7.Z-=TE);
U3.13(U3.Q-.13=Q) = FD2SA(U2.RST_-.13=CD,U3.D-.13=D,U3.Q-.13=TI,
         CP-=CP,U7.Z-=TE);
U3.12(U3.Q-.12=Q) = FD2SA(U2.RST_-.12=CD,U3.D-.12=D,U3.Q-.12=TI,
         CP-=CP,U7.Z-=TE);
U3.11(U3.Q-.11=Q) = FD2SA(U2.RST_-.11=CD,U3.D-.11=D,U3.Q-.11=TI,
         CP-=CP,U7.Z-=TE);
U3.10(U3.Q-.10=Q) = FD2SA(U2.RST_-.10=CD,U3.D-.10=D,U3.Q-.10=TI,
         CP-=CP,U7.Z-=TE);
U3.9(U3.Q-.9=Q) = FD2SA(U2.RST_-.9=CD,U3.D-.9=D,U3.Q-.9=TI,CP-=CP,
         U7.Z-=TE);
U3.8(U3.Q-.8=Q) = FD2SA(U2.RST_-.8=CD,U3.D-.8=D,U3.Q-.8=TI,CP-=CP,
         U7.Z-=TE);
U3.7(U3.Q-.7=Q) = FD2SA(U2.RST_-.7=CD,U3.D-.7=D,U3.Q-.7=TI,CP-=CP,
         U7.Z-=TE);
U3.6(U3.Q-.6=Q) = FD2SA(U2.RST_-.6=CD,U3.D-.6=D,U3.Q-.6=TI,CP-=CP,
         U7.Z-=TE);
U3.5(U3.Q-.5=Q) = FD2SA(U2.RST_-.5=CD,U3.D-.5=D,U3.Q-.5=TI,CP-=CP,
         U7.Z-=TE);
U3.4(U3.Q-.4=Q) = FD2SA(U2.RST_-.4=CD,U3.D-.4=D,U3.Q-.4=TI,CP-=CP,
         U7.Z-=TE);
U3.3(U3.Q-.3=Q) = FD2SA(U2.RST_-.3=CD,U3.D-.3=D,U3.Q-.3=TI,CP-=CP,
         U7.Z-=TE);
U3.2(U3.Q-.2=Q) = FD2SA(U2.RST_-.2=CD,U3.D-.2=D,U3.Q-.2=TI,CP-=CP,
         U7.Z-=TE);
U3.1(U3.Q-.1=Q) = FD2SA(U2.RST_-.1=CD,U3.D-.1=D,U3.Q-.1=TI,CP-=CP,
         U7.Z-=TE);
U3.0(U3.Q-.0=Q) = FD2SA(U2.RST_-.0=CD,U3.D-.0=D,U3.Q-.0=TI,CP-=CP,
         U7.Z-=TE);
U7(U7.Z-=Z) = B3A(WAIT-=A);
U8.5(U8.Q-.5=Q) = FD2SA(RESET_-=CD,CP-=CP,U8.D-.5=D,U8.Q-.5=TI,
         WAIT-=TE);
U8.4(U8.Q-.4=Q) = FD2SA(RESET_-=CD,CP-=CP,U8.D-.4=D,U8.Q-.4=TI,
         WAIT-=TE);
U8.3(U8.Q-.3=Q) = FD2SA(RESET_-=CD,CP-=CP,U8.D-.3=D,U8.Q-.3=TI,
         WAIT-=TE);
U8.2(U8.Q-.2=Q) = FD2SA(RESET_-=CD,CP-=CP,U8.D-.2=D,U8.Q-.2=TI,
         WAIT-=TE,;
U8.1(U8.Q-.1=Q) = FD2SA(RESET_-=CD,CP-=CP,U8.D-.1=D,U8.Q-.1=TI,
         WAIT-=TE);
U8.0(U8.Q-.0=Q) = FD2SA(RESET_-=CD,CP-=CP,U8.D-.0=D,U8.Q-.0=TI,
         WAIT-=TE);
U5(U5.Z-=Z) = AND2C(U6.Z-=A,U5.B-=B);
U6(U6.Z-=Z) = N1B(D-=A);
U0(PSE-=Z) = MUX81HB(U0.C-=C,U1.B-=B,DLY_POL-=A,U0.D7-=D7,U0.D6-=D6,
         U0.D5-=D5,U0.D4-=D4,U0.D3-=D3,U0.D2-=D2,U0.D1-=D1,
         U0.D0-=D0);


/* extractors ******************************/

U3.Q-.8 = (U0.D2-);
U3.Q-.23 = (U0.D7-);
U3.Q-.4 = (U0.D1-);
U3.Q-.13 = (U0.D4-);
U3.Q-.18 = (U0.D6-);
U3.Q-.10 = (U0.D3-);
U3.Q-.16 = (U0.D5-);
U4.D-.0 = (U5.Z-);
U4.Q-.4 = (CNV-);
U4.Q-.3 = (M-0.3);
U4.Q-.2 = (M-0.2);
U4.Q-.1 = (M-0.1);
U4.Q-.0 = (M-0.0);
U4.D-.4 = (M-0.3);
U4.D-.3 = (M-0.2);
U4.D-.2 = (M-0.1);
U4.D-.1 = (M-0.0);
U3.Q-.4 = (U1.D0-);
U3.Q-.5 = (U1.D1-);
U3.Q-.9 = (U1.D2-);
U3.Q-.11 = (U1.D3-);
U3.Q-.14 = (U1.D4-);
```

```
M612(M612.Z--Z) = N1C(M22.Z--A);
M432(M432.Z--Z) = AND2B(M286.Z--A,M298.Z--B);
M616(M616.Z--Z) = N1D(M24.Z--A);
M29(M29.Z--Z) = AND2C(M24.Z--B,M615.Z--A);
M52(M52.Z--Z) = AND2C(M9.Z--A,M15.Z--B);
M607(M607.Z--Z) = N1D(M40.Z--A);
M275(M275.Z--Z) = AND2B(M615.Z--B,M607.Z--A);
M113(M113.Z--Z) = ND3C(M108.Z--A,M109.Z--B,M112.Z--C);
M105(M105.Z--Z) = AND2B(M613.Z--B,M612.Z--A);
M299(M299.Z--Z) = ND4B(M24.Z--B,M607.Z--A,M623.Z--C,M15.Z--D);
M425(M425.Z--Z) = AND2B(M169.Z--A,M177.Z--B);
M5(M5.Z--Z) = N1D(WAIT--A);
M608(M608.Z--Z) = N1D(M28.Z--A);
M28(M28.Z--Z) = ND2C(M5.Z--B,M607.Z--A);
M470(M470.Z--Z) = AND2B(M222.Z--A,M230.Z--B);
M235(M235.Z--Z) = AND2B(M613.Z--B,M607.Z--A);
M623(M623.Z--Z) = N1D(M14.Z--A);
M14(M14.Z--Z) = N1D(STBIT2I--A);
M122(M122.Z--Z) = AND3C(M616.Z--A,M14.Z--B,M9.Z--C);
M30(M30.Z--Z) = AND3B(M14.Z--A,M9.Z--B,M15.Z--C);
M665(M665.Z--Z) = N1D(M12.Z--A);
M12(M12.Z--Z) = ND2C(M611.Z--B,M607.Z--A);
M611(M611.Z--Z) = N1C(M5.Z--A);
M615(M615.Z--Z) = N1D(M2.Z--A);
M2(M2.Z--Z) = N1E(STBIT0I--A);
M13(M13.Z--Z) = AND2C(M2.Z--A,M616.Z--B);
M125(M125.Z--Z) = AND3B(M2.Z--C,M5.Z--A,M22.Z--B);
M184(M184.Z--Z) = AND3B(M2.Z--B,M616.Z--C,M5.Z--A);
M68(M68.Z--Z) = AND3B(M2.Z--B,M616.Z--C,M22.Z--A);
M364(M364.Z--Z) = ND3B(M629.Z--C,M29.Z--B,M665.Z--A);
M371(M371.Z--Z) = ND3B(M629.Z--C,M13.Z--B,M665.Z--A);
M436(M436.Z--Z) = AND2B(M364.Z--A,M371.Z--B);
M391(M391.Z--Z) = ND4B(M611.Z--B,M14.Z--C,M607.Z--A,M629.Z--D);
M386(M386.Z--Z) = AND2B(M2.Z--A,M623.Z--B);
M387(M387.Z--Z) = ND3B(M386.Z--B,M630.Z--C,M665.Z--A);
M288(M288.Z--Z) = AND2B(M616.Z--B,M615.Z--A);
M374(M374.Z--Z) = ND3B(M14.Z--C,M288.Z--B,M665.Z--A);
M453(M453.Z--Z) = ND4B(M380.Z--D,M350.Z--B,M346.Z--A,M377.Z--C);
M380(M380.Z--Z) = ND3B(M623.Z--C,M13.Z--B,M665.Z--A);
M480(M480.Z--Z) = AND2B(M380.Z--A,M383.Z--B);
M478(M478.Z--Z) = AND2B(M303.Z--A,M307.Z--B);
M620(M620.Z--Z) = AND2B(M238.Z--A,M246.Z--B);
M471(M471.Z--Z) = AND2B(M242.Z--B,M238.Z--A);
M240(M240.Z--Z) = AND2B(M5.Z--A,M613.Z--B);
M19(M19.Z--Z) = AND3C(M2.Z--A,M616.Z--B,M623.Z--C);
M657(M657.Z--Z) = AND3B(M70.Z--A,M95.Z--C,M86.Z--B);
M557(M557.Z--Z) = AND2B(M61.Z--B,M57.Z--A);
M31(M31.Z--Z) = ND3C(M29.Z--B,M30.Z--C,M608.Z--A);
M698(YINCEN--Z) = N1B(M31.Z--A);
M485(M485.Z--Z) = AND2B(M86.Z--A,M113.Z--B);
M660(M660.Z--Z) = ND2B(M141.Z--A,M145.Z--B);
M637(M637.Z--Z) = AND2B(M141.Z--A,M145.Z--B);
M46(M46.Z--Z) = AND3C(M5.Z--B,M607.Z--A,M612.Z--C);
M402(M402.Z--Z) = AND2C(M218.Z--B,M214.Z--A);
M258(M258.Z--Z) = ND3C(M18.Z--A,M208.Z--B,M633.Z--C);
M87(M87.Z--Z) = ND2B(M2.Z--B,M40.Z--A);
M155(M155.Z--Z) = AND2B(M24.Z--A,M623.Z--B);
M157(M157.Z--Z) = ND3B(M155.Z--B,M154.Z--A,M20.Z--C);
M512(M512.Z--Z) = AND2B(M157.Z--A,M161.Z--B);
M78(M78.Z--Z) = ND2B(M14.Z--B,M40.Z--A);
M593(M593.Z--Z) = ND2B(M78.Z--A,M82.Z--B);
M598(EOC--Z) = ND2B(M210.Z--A,M258.Z--B);
M285(M285.Z--Z) = AND3B(M616.Z--A,M14.Z--B,M629.Z--C);
M286(M286.Z--Z) = ND3C(M200.Z--B,M285.Z--C,M608.Z--A);
M200(M200.Z--Z) = AND2B(M615.Z--B,M22.Z--A);
M201(M201.Z--Z) = AND3B(M616.Z--A,M14.Z--B,M15.Z--C);
M202(M202.Z--Z) = ND3C(M200.Z--B,M201.Z--C,M608.Z--A);
M667(M667.Z--Z) = ND2B(M202.Z--A,M206.Z--B);
M541(M541.Z--Z) = ND3B(M153.Z--A,M198.Z--C,M194.Z--B);
M536(M536.Z--Z) = ND2B(M61.Z--B,M57.Z--A);
M530(SC--Z) = ND4B(M153.Z--D,M49.Z--C,M39.Z--B,M35.Z--A);
M458(M458.Z--Z) = AND3B(M70.Z--C,M53.Z--A,M57.Z--B);
M529(FC--Z) = ND4B(M27.Z--A,M353.Z--D,M346.Z--C,M65.Z--B);
M654(M654.Z--Z) = ND2B(M61.Z--A,M65.Z--B);
```

```
M502(M502.Z--Z) = AND2B(M61.Z--A,M65.Z--B);
M35(M35.Z--Z) = ND3C(M25.Z--B,M34.Z--C,M665.Z--A);
M49(M49.Z--Z) = ND3C(M46.Z--A,M10.Z--C,M47.Z--B);
M10(M10.Z--Z) = AND3C(M623.Z--A,M9.Z--B,M630.Z--C);
M18(M18.Z--Z) = AND3C(M3.Z--C,M5.Z--B,M607.Z--A);
M3(M3.Z--Z) = N1C(SPRCYC--A);
M613(M613.Z--Z) = N1C(M3.Z--A);
M115(M115.Z--Z) = AND3B(M2.Z--C,M3.Z--B,M5.Z--A);
M75(M75.Z--Z) = ND2B(M14.Z--A,M9.Z--B);
M74(M74.Z--Z) = ND2B(M2.Z--A,M616.Z--B);
M76(M76.Z--Z) = NR2B(M75.Z--B,M74.Z--A);
M77(M77.Z--Z) = ND3B(M67.Z--A,M73.Z--B,M76.Z--C);
M73(M73.Z--Z) = AND3B(M3.Z--C,M5.Z--A,M612.Z--B);
M366(M366.Z--Z) = AND2B(M3.Z--A,M24.Z--B);
M94(M94.Z--Z) = AND3C(M623.Z--A,M629.Z--B,M630.Z--C);
M92(M92.Z--Z) = ND2B(M2.Z--A,M24.Z--B);
M91(M91.Z--Z) = ND2B(M613.Z--B,M612.Z--A);
M93(M93.Z--Z) = NR2B(M92.Z--B,M91.Z--A);
M95(M95.Z--Z) = ND3C(M94.Z--C,M90.Z--A,M93.Z--B);
M166(M166.Z--Z) = AND3B(M607.Z--A,M6.Z--C,M66.Z--B);
M260(M260.Z--Z) = AND3B(M2.Z--A,M24.Z--B,M623.Z--C);
M67(M67.Z--Z) = AND3C(INC--C,M607.Z--A,M66.Z--B);
M586(M586.Z--Z) = ND4B(M242.Z--D,M222.Z--B,M206.Z--A,M234.Z--C);
M581(M581.Z--Z) = ND4B(M95.Z--A,M113.Z--C,M119.Z--D,M103.Z--B);
M580(M580.Z--Z) = ND4B(M53.Z--B,M57.Z--C,M49.Z--A,M65.Z--D);
M582(M582.Z--Z) = NR2B(M581.Z--B,M580.Z--A);
M664(M664.Z--Z) = AND3B(M153.Z--B,M149.Z--A,M161.Z--C);
M549(M549.Z--Z) = ND2B(M149.Z--B,M145.Z--A);
M147(M147.Z--Z) = AND3B(M3.Z--A,M616.Z--C,M615.Z--B);
M346(M346.Z--Z) = ND3C(M221.Z--C,M25.Z--B,M665.Z--A);
M350(M350.Z--Z) = ND3C(M221.Z--C,M29.Z--B,M608.Z--A);
M221(M221.Z--Z) = AND2B(M623.Z--A,M9.Z--B);
M222(M222.Z--Z) = ND3C(M221.Z--C,M42.Z--A,M1.Z--B);
M42(M42.Z--Z) = AND3C(INC--B,M5.Z--C,M607.Z--A);
M448(M448.Z--Z) = ND4B(M242.Z--A,M254.Z--C,M246.Z--B,M262.Z--D);
M492(M492.Z--Z) = ND4B(M250.Z--A,M266.Z--B,M270.Z--C,M286.Z--D);
M584(M584.Z--Z) = ND4B(M190.Z--C,M153.Z--A,M161.Z--B,M194.Z--D);
M532(M532.Z--Z) = AND3B(M141.Z--B,M149.Z--C,M119.Z--A);
M16(M16.Z--Z) = AND3B(M14.Z--A,M629.Z--B,M15.Z--C);
M332(M332.Z--Z) = AND2B(M2.Z--B,M5.Z--A);
M383(M383.Z--Z) = ND3B(M276.Z--B,M630.Z--C,M665.Z--A);
M276(M276.Z--Z) = AND2B(M616.Z--A,M14.Z--B);
M334(M334.Z--Z) = ND3B(M332.Z--B,M276.Z--C,M227.Z--A);
M227(M227.Z--Z) = AND2B(M607.Z--A,M6.Z--B);
M230(M230.Z--Z) = ND3C(M227.Z--A,M13.Z--B,M16.Z--C);
M17(M17.Z--Z) = ND3B(M13.Z--B,M16.Z--C,M665.Z--A);
M531(M531.Z--Z) = AND3B(M53.Z--B,M17.Z--A,M113.Z--C);
M534(LC_1--Z) = ND3B(M533.Z--C,M532.Z--B,M531.Z--A);
M533(M533.Z--Z) = AND3B(M190.Z--B,M230.Z--C,M186.Z--A);
M467(M467.Z--Z) = AND3B(M202.Z--C,M190.Z--A,M198.Z--B);
M513(M513.Z--Z) = AND3B(M190.Z--C,M169.Z--B,M165.Z--A);
M551(M551.Z--Z) = ND2B(M190.Z--B,M161.Z--A);
M190(M190.Z--Z) = ND3C(M52.Z--C,M187.Z--A,M51.Z--B);
M187(M187.Z--Z) = AND3C(M5.Z--B,M613.Z--C,M607.Z--A);
M234(M234.Z--Z) = ND3C(M18.Z--A,M204.Z--B,M633.Z--C);
M204(M204.Z--Z) = AND3B(M2.Z--A,M24.Z--B,M14.Z--C);
M206(M206.Z--Z) = ND3C(M187.Z--A,M204.Z--B,M633.Z--C);
M250(M250.Z--Z) = ND3C(M187.Z--A,M248.Z--B,M633.Z--C);
M248(M248.Z--Z) = AND3B(M24.Z--B,M615.Z--A,M14.Z--C);
M270(M270.Z--Z) = ND3C(M18.Z--A,M248.Z--B,M633.Z--C);
M572(M572.Z--Z) = AND2B(M250.Z--A,M270.Z--B);
M450(M450.Z--Z) = AND2B(M290.Z--B,M270.Z--A);
M338(M338.Z--Z) = ND3B(M317.Z--B,M273.Z--C,M608.Z--A);
M317(M317.Z--Z) = AND2B(M3.Z--A,M615.Z--B);
M319(M319.Z--Z) = ND3C(M317.Z--B,M314.Z--C,M608.Z--A);
M433(M433.Z--Z) = AND2B(M319.Z--B,M303.Z--A);
M409(M409.Z--Z) = AND2B(M307.Z--A,M311.Z--B);
M683(M683.Z--Z) = AND3B(M319.Z--C,M311.Z--A,M315.Z--B);
M676(M676.Z--Z) = NR2B(M675.Z--B,M669.Z--A);
M692(ENSPR--Z) = ND3B(M663.Z--A,M676.Z--B,M691.Z--C);
M691(M691.Z--Z) = NR2B(M690.Z--B,M684.Z--A);
M681(M681.Z--Z) = ND2B(M303.Z--A,M307.Z--B);
M476(M476.Z--Z) = AND2B(M290.Z--A,M294.Z--B);
M281(M281.Z--Z) = AND2B(M14.Z--A,M629.Z--B);
```

```
M282(M282.Z--Z) = ND3B(M281.Z--C,M42.Z--A,M1.Z--B);
M408(M408.Z--Z) = AND2B(M294.Z--B,M282.Z--A);
M680(M680.Z--Z) = ND2B(M294.Z--A,M298.Z--B);
M682(M682.Z--Z) = NR2B(M681.Z--B,M680.Z--A);
M684(M684.Z--Z) = ND3B(M683.Z--C,M679.Z--A,M682.Z--B);
M678(M678.Z--Z) = ND2B(M290.Z--B,M286.Z--A);
M679(M679.Z--Z) = NR2B(M678.Z--B,M677.Z--A);
M677(M677.Z--Z) = ND2B(M254.Z--A,M270.Z--B);
M254(M254.Z--Z) = ND3C(M18.Z--A,M43.Z--B,M633.Z--C);
M43(M43.Z--Z) = AND3B(M2.Z--A,M616.Z--B,M14.Z--C);
M45(M45.Z--Z) = ND3C(M20.Z--C,M42.Z--A,M43.Z--B);
M139(M139.Z--Z) = AND3B(M616.Z--C,M613.Z--A,M615.Z--B);
M141(M141.Z--Z) = ND3C(M42.Z--A,M140.Z--C,M139.Z--B);
M140(M140.Z--Z) = AND3B(M14.Z--A,M9.Z--B,M630.Z--C);
M149(M149.Z--Z) = ND3C(M42.Z--A,M147.Z--B,M140.Z--C);
M583(M583.Z--Z) = ND4B(M141.Z--B,M123.Z--A,M149.Z--D,M145.Z--C);
M585(M585.Z--Z) = NR2B(M584.Z--B,M583.Z--A);
M589(SE--Z) = ND3B(M582.Z--A,M585.Z--B,M588.Z--C);
M588(M588.Z--Z) = NR2B(M587.Z--B,M586.Z--A);
M587(M587.Z--Z) = ND4B(M327.Z--B,M361.Z--D,M357.Z--C,M274.Z--A);
M80(M80.Z--Z) = AND2C(M24.Z--A,M14.Z--B);
M82(M82.Z--Z) = ND3B(M79.Z--A,M80.Z--B,M52.Z--C);
M327(M327.Z--Z) = ND3B(M272.Z--B,M239.Z--A,M80.Z--C);
M239(M239.Z--Z) = AND2C(INC--B,M607.Z--A);
M6(M6.Z--Z) = N1C(INC--A);
M89(M89.Z--Z) = ND2B(INC--A,M5.Z--B);
M108(M108.Z--Z) = AND3C(INC--C,CO--B,M607.Z--A);
M66(M66.Z--Z) = N1C(CO--A);
M263(M263.Z--Z) = AND3B(CO--B,M611.Z--C,M607.Z--A);
M266(M266.Z--Z) = ND3B(M263.Z--A,M260.Z--B,M633.Z--C);
M262(M262.Z--Z) = ND3C(M260.Z--B,M259.Z--A,M633.Z--C);
M259(M259.Z--Z) = AND3B(M611.Z--C,M607.Z--A,M66.Z--B);
M104(M104.Z--Z) = AND2B(M607.Z--A,M66.Z--B);
M88(M88.Z--Z) = ND2B(M607.Z--A,M66.Z--B);
M90(M90.Z--Z) = NR2C(M89.Z--B,M88.Z--A);
M103(M103.Z--Z) = ND3C(M94.Z--C,M90.Z--A,M101.Z--B);
M101(M101.Z--Z) = NR2B(M99.Z--A,M92.Z--B);
M99(M99.Z--Z) = ND2B(M3.Z--B,M612.Z--A);
M1(M1.Z--Z) = AND3B(M2.Z--B,M3.Z--A,M616.Z--C);
M11(M11.Z--Z) = ND3B(M10.Z--C,M1.Z--B,M4.Z--A);
M151(M151.Z--Z) = AND3B(M2.Z--B,M24.Z--C,M613.Z--A);
M153(M153.Z--Z) = ND3C(M46.Z--A,M10.Z--C,M151.Z--B);
M27(M27.Z--Z) = ND3C(M23.Z--A,M25.Z--B,M10.Z--C);
M25(M25.Z--Z) = AND2C(M2.Z--A,M24.Z--B);
M64(M64.Z--Z) = AND3B(M623.Z--A,M9.Z--B,M15.Z--C);
M65(M65.Z--Z) = ND3C(M25.Z--B,M64.Z--C,M608.Z--A);
M546(M546.Z--Z) = ND2B(M113.Z--B,M65.Z--A);
M547(M547.Z--Z) = NR2B(M546.Z--B,M545.Z--A);
M545(M545.Z--Z) = ND2B(M53.Z--B,M45.Z--A);
M420(M420.Z--Z) = AND2B(M61.Z--B,M53.Z--A);
M500(M500.Z--Z) = AND3B(M53.Z--B,M57.Z--C,M49.Z--A);
M652(M652.Z--Z) = AND3B(M31.Z--A,M49.Z--C,M35.Z--B);
M600(M600.Z--Z) = AND2B(M95.Z--A,M103.Z--B);
M601(M601.Z--Z) = AND3B(M153.Z--B,M123.Z--A,M194.Z--C);
M602(STBEN--Z) = ND3B(M600.Z--B,M526.Z--A,M601.Z--C);
M526(M526.Z--Z) = AND2B(M57.Z--B,M49.Z--A);
M535(M535.Z--Z) = ND3B(M49.Z--C,M27.Z--A,M35.Z--B);
M537(M537.Z--Z) = NR2B(M536.Z--B,M535.Z--A);
M544(REQ--Z) = ND3B(M537.Z--A,M540.Z--B,M543.Z--C);
M543(M543.Z--Z) = NR2B(M542.Z--B,M541.Z--A);
M542(M542.Z--Z) = ND3B(M202.Z--A,M286.Z--B,M298.Z--C);
M489(M489.Z--Z) = AND2B(M202.Z--A,M210.Z--B);
M446(M446.Z--Z) = AND2B(M222.Z--B,M210.Z--A);
M596(M596.Z--Z) = AND3B(M210.Z--A,M342.Z--C,M258.Z--B);
M597(CLRXAU--Z) = ND3B(M596.Z--C,M592.Z--A,M595.Z--B);
M595(M595.Z--Z) = NR2B(M594.Z--B,M593.Z--A);
M594(M594.Z--Z) = ND2B(M87.Z--A,M157.Z--B);
M695(M695.Z--Z) = AND2B(M87.Z--A,M258.Z--B);
M405(M405.Z--Z) = AND2B(M250.Z--A,M258.Z--B);
M673(M673.Z--Z) = ND2B(M250.Z--B,M246.Z--A);
M672(M672.Z--Z) = ND2B(M242.Z--B,M238.Z--A);
M674(M674.Z--Z) = NR2B(M673.Z--B,M672.Z--A);
M675(M675.Z--Z) = ND3B(M671.Z--B,M670.Z--A,M674.Z--C);
M670(M670.Z--Z) = AND3B(M218.Z--C,M210.Z--A,M214.Z--B);
```

```
M428(M428.Z--Z) = AND2B(M214.Z--A,M230.Z--B);
M617(M617.Z--Z) = ND3B(M214.Z--C,M516.Z--B,M445.Z--A);
M516(M516.Z--Z) = AND2B(M202.Z--B,M198.Z--A);
M61(M61.Z--Z) = ND3C(M20.Z--C,M55.Z--B,M46.Z--A);
M55(M55.Z--Z) = AND3C(M616.Z--B,M615.Z--A,M14.Z--C);
M218(M218.Z--Z) = ND3C(M217.Z--C,M55.Z--B,M4.Z--A);
M57(M57.Z--Z) = ND3C(M52.Z--C,M55.Z--B,M46.Z--A);
M198(M198.Z--Z) = ND3C(M55.Z--B,M46.Z--A,M633.Z--C);
M137(M137.Z--Z) = ND3B(M132.Z--C,M46.Z--A,M47.Z--B);
M563(M563.Z--Z) = AND2B(M141.Z--B,M137.Z--A);
M397(M397.Z--Z) = AND2B(M169.Z--B,M165.Z--A);
M398(M398.Z--Z) = ND3B(M397.Z--B,M396.Z--A,M173.Z--C);
M396(M396.Z--Z) = AND2B(M153.Z--B,M141.Z--A);
M487(M487.Z--Z) = ND4B(M190.Z--D,M141.Z--A,M145.Z--B,M165.Z--C);
M488(M488.Z--Z) = NR2B(M487.Z--B,M486.Z--A);
M486(M486.Z--Z) = ND3B(M129.Z--C,M485.Z--B,M484.Z--A);
M484(M484.Z--Z) = AND2B(M70.Z--B,M31.Z--A);
M556(M556.Z--Z) = AND2B(M53.Z--B,M31.Z--A);
M558(M558.Z--Z) = ND3B(M557.Z--C,M556.Z--B,M417.Z--A);
M562(M562.Z--Z) = NR2B(M561.Z--B,M558.Z--A);
M561(M561.Z--Z) = ND3B(M123.Z--C,M559.Z--A,M507.Z--B);
M559(M559.Z--Z) = AND2B(M95.Z--B,M86.Z--A);
M86(M86.Z--Z) = ND3B(M19.Z--B,M18.Z--A,M633.Z--C);
M242(M242.Z--Z) = ND3C(M240.Z--B,M239.Z--A,M19.Z--C);
M571(M571.Z--Z) = AND2B(M242.Z--A,M246.Z--B);
M474(M474.Z--Z) = AND2B(M254.Z--B,M246.Z--A);
M477(M477.Z--Z) = ND3B(M476.Z--C,M475.Z--B,M474.Z--A);
M483(STBIT10--Z) = ND3B(M464.Z--A,M473.Z--B,M482.Z--C);
M482(M482.Z--Z) = NR2B(M481.Z--B,M477.Z--A);
M481(M481.Z--Z) = ND3B(M480.Z--C,M479.Z--B,M478.Z--A);
M479(M479.Z--Z) = AND2B(M374.Z--B,M311.Z--A);
M625(M625.Z--Z) = AND2B(M374.Z--A,M383.Z--B);
M413(M413.Z--Z) = AND2B(M383.Z--A,M387.Z--B);
M688(M688.Z--Z) = ND2B(M387.Z--A,M391.Z--B);
M437(M437.Z--Z) = ND3B(M436.Z--B,M435.Z--A,M391.Z--C);
M435(M435.Z--Z) = AND2B(M323.Z--A,M342.Z--B);
M575(M575.Z--Z) = AND2B(M319.Z--A,M323.Z--B);
M577(M577.Z--Z) = ND3B(M576.Z--B,M575.Z--A,M361.Z--C);
M576(M576.Z--Z) = AND2B(M334.Z--A,M350.Z--B);
M495(M495.Z--Z) = ND4B(M323.Z--A,M350.Z--B,M377.Z--C,M384.Z--D);
M384(M384.Z--Z) = ND4B(M611.Z--B,M615.Z--C,M14.Z--D,M607.Z--A);
M687(M687.Z--Z) = ND2B(M380.Z--A,M384.Z--B);
M689(M689.Z--Z) = NR2B(M688.Z--B,M687.Z--A);
M690(M690.Z--Z) = ND3B(M686.Z--B,M685.Z--A,M689.Z--C);
M685(M685.Z--Z) = AND3B(M323.Z--A,M342.Z--B,M346.Z--C);
M522(M522.Z--Z) = AND3B(M374.Z--C,M353.Z--B,M346.Z--A);
M353(M353.Z--Z) = ND3B(M79.Z--A,M629.Z--C,M80.Z--B);
M79(M79.Z--Z) = AND2B(M2.Z--B,M607.Z--A);
M329(M329.Z--Z) = AND2B(M2.Z--A,M629.Z--B);
M292(M292.Z--Z) = AND2B(M2.Z--B,M611.Z--A);
M212(M212.Z--Z) = AND3B(M2.Z--B,M616.Z--C,M611.Z--A);
M214(M214.Z--Z) = ND3C(M69.Z--C,M67.Z--A,M212.Z--B);
M69(M69.Z--Z) = AND2B(M14.Z--A,M9.Z--B);
M237(M237.Z--Z) = AND3B(M14.Z--A,M629.Z--B,M630.Z--C);
M238(M238.Z--Z) = ND3C(M235.Z--A,M13.Z--B,M237.Z--C);
M404(M404.Z--Z) = AND2B(M238.Z--B,M222.Z--A);
M643(M643.Z--Z) = AND2B(M202.Z--A,M222.Z--B);
M645(M645.Z--Z) = ND3B(M286.Z--C,M644.Z--B,M643.Z--A);
M644(M644.Z--Z) = AND2B(M242.Z--A,M274.Z--B);
M274(M274.Z--Z) = ND3B(M273.Z--C,M272.Z--B,M239.Z--A);
M272(M272.Z--Z) = AND2B(M5.Z--A,M615.Z--B);
M163(M163.Z--Z) = AND3B(M2.Z--B,M24.Z--C,M5.Z--A);
M169(M169.Z--Z) = ND3C(M94.Z--C,M166.Z--A,M163.Z--B);
M445(M445.Z--Z) = AND2B(M190.Z--B,M169.Z--A);
M569(M569.Z--Z) = ND3B(M222.Z--C,M568.Z--B,M445.Z--A);
M568(M568.Z--Z) = AND2B(M218.Z--B,M198.Z--A);
M619(M619.Z--Z) = AND2B(M218.Z--A,M230.Z--B);
M671(M671.Z--Z) = AND3B(M222.Z--A,M230.Z--B,M234.Z--C);
M447(M447.Z--Z) = ND3B(M446.Z--B,M445.Z--A,M234.Z--C);
M449(M449.Z--Z) = NR2B(M448.Z--B,M447.Z--A);
M455(STBIT20--Z) = ND3B(M444.Z--A,M449.Z--B,M454.Z--C);
M454(M454.Z--Z) = NR2B(M453.Z--B,M452.Z--A);
M452(M452.Z--Z) = ND3B(M311.Z--C,M451.Z--B,M450.Z--A);
M451(M451.Z--Z) = AND2B(M303.Z--B,M299.Z--A);
```

```
M302(M302.Z-=Z) = AND3B(M616.Z-=A,M623.Z-=B,M629.Z-=C);
M303(M303.Z-=Z) = ND3C(M154.Z-=B,M302.Z-=C,M608.Z-=A);
M154(M154.Z-=Z) = AND2B(M2.Z-=B,M613.Z-=A);
M109(M109.Z-=Z) = AND3B(M2.Z-=C,M5.Z-=A,M613.Z-=B);
M145(M145.Z-=Z) = ND3C(M122.Z-=C,M108.Z-=A,M109.Z-=B);
M294(M294.Z-=Z) = ND3C(M292.Z-=B,M223.Z-=A,M122.Z-=C);
M223(M223.Z-=Z) = AND2B(CO-=B,M607.Z-=A);
M178(M178.Z-=Z) = N1B(DLY_POL-=A);
M179(M179.Z-=Z) = AND2B(M607.Z-=A,M178.Z-=B);
M162(M162.Z-=Z) = AND3B(CO-=B,M607.Z-=A,M6.Z-=C);
M165(M165.Z-=Z) = ND3C(M94.Z-=C,M163.Z-=B,M162.Z-=A);
M466(M466.Z-=Z) = AND2B(M161.Z-=A,M165.Z-=B);
M566(M566.Z-=Z) = ND3B(M563.Z-=A,M466.Z-=C,M465.Z-=B);
M570(M570.Z-=Z) = NR2B(M569.Z-=B,M566.Z-=A);
M579(ENXAU-=Z) = ND3B(M562.Z-=A,M570.Z-=B,M578.Z-=C);
M578(M578.Z-=Z) = NR2B(M577.Z-=B,M574.Z-=A);
M574(M574.Z-=Z) = ND3B(M573.Z-=C,M572.Z-=B,M571.Z-=A);
M573(M573.Z-=Z) = AND2B(M303.Z-=A,M315.Z-=B);
M494(M494.Z-=Z) = ND4B(M290.Z-=A,M294.Z-=B,M319.Z-=D,M315.Z-=C);
M496(M496.Z-=Z) = NR2B(M495.Z-=B,M494.Z-=A);
M497(STBIT00-=Z) = ND3B(M488.Z-=A,M493.Z-=B,M496.Z-=C);
M493(M493.Z-=Z) = NR2B(M492.Z-=B,M491.Z-=A);
M491(M491.Z-=Z) = ND3B(M489.Z-=A,M402.Z-=B,M226.Z-=C);
M226(M226.Z-=Z) = ND3B(M224.Z-=B,M223.Z-=A,M122.Z-=C);
M224(M224.Z-=Z) = AND2B(M2.Z-=B,M6.Z-=A);
M4(M4.Z-=Z) = AND3B(M5.Z-=C,M607.Z-=A,M6.Z-=B);
M246(M246.Z-=Z) = ND3C(M52.Z-=C,M19.Z-=B,M4.Z-=A);
M368(M368.Z-=Z) = ND3B(M366.Z-=B,M52.Z-=C,M608.Z-=A);
M412(M412.Z-=Z) = AND2B(M338.Z-=A,M368.Z-=B);
M414(M414.Z-=Z) = ND3B(M413.Z-=B,M412.Z-=A,M390.Z-=C);
M390(M390.Z-=Z) = ND3B(M29.Z-=B,M630.Z-=C,M665.Z-=A);
M377(M377.Z-=Z) = ND3B(M623.Z-=C,M29.Z-=B,M665.Z-=A);
M686(M686.Z-=Z) = AND3B(M361.Z-=B,M350.Z-=A,M377.Z-=C);
M361(M361.Z-=Z) = ND3C(M360.Z-=C,M332.Z-=B,M239.Z-=A);
M360(M360.Z-=Z) = AND2B(M616.Z-=A,M629.Z-=B);
M106(M106.Z-=Z) = AND3B(M2.Z-=A,M616.Z-=B,M630.Z-=C);
M107(M107.Z-=Z) = ND3B(M105.Z-=B,M104.Z-=A,M106.Z-=C);
M394(M394.Z-=Z) = AND2B(M95.Z-=A,M107.Z-=B);
M651(M651.Z-=Z) = AND3B(M27.Z-=C,M21.Z-=B,M11.Z-=A);
M457(M457.Z-=Z) = AND2B(M21.Z-=A,M45.Z-=B);
M392(M392.Z-=Z) = AND2B(M27.Z-=B,M21.Z-=A);
M395(M395.Z-=Z) = ND3B(M394.Z-=C,M393.Z-=B,M392.Z-=A);
M399(M399.Z-=Z) = NR2B(M398.Z-=B,M395.Z-=A);
M416(STBIT40-=Z) = ND3B(M399.Z-=A,M407.Z-=B,M415.Z-=C);
M415(M415.Z-=Z) = NR2B(M414.Z-=B,M411.Z-=A);
M411(M411.Z-=Z) = ND3B(M410.Z-=C,M409.Z-=B,M408.Z-=A);
M410(M410.Z-=Z) = AND2B(M315.Z-=A,M330.Z-=B);
M330(M330.Z-=Z) = ND3B(M329.Z-=B,M630.Z-=C,M665.Z-=A);
M290(M290.Z-=Z) = ND3C(M288.Z-=B,M64.Z-=C,M665.Z-=A);
M646(M646.Z-=Z) = AND2B(M290.Z-=A,M298.Z-=B);
M298(M298.Z-=Z) = ND3C(M23.Z-=A,M25.Z-=B,M20.Z-=C);
M23(M23.Z-=Z) = AND2B(M607.Z-=A,M22.Z-=B);
M131(M131.Z-=Z) = AND3B(M2.Z-=B,M24.Z-=C,M22.Z-=A);
M133(M133.Z-=Z) = ND3B(M132.Z-=C,M67.Z-=A,M131.Z-=B);
M132(M132.Z-=Z) = AND2B(M623.Z-=A,M629.Z-=B);
M34(M34.Z-=Z) = AND3B(M623.Z-=A,M629.Z-=B,M15.Z-=C);
M39(M39.Z-=Z) = ND3B(M23.Z-=A,M25.Z-=B,M34.Z-=C);
M590(M590.Z-=Z) = ND2B(M39.Z-=B,M35.Z-=A);
M592(M592.Z-=Z) = NR2B(M591.Z-=B,M590.Z-=A);
M591(M591.Z-=Z) = ND2B(M41.Z-=A,M71.Z-=B);
M503(M503.Z-=Z) = AND2B(M70.Z-=A,M71.Z-=B);
M693(M693.Z-=Z) = AND2B(M41.Z-=A,M71.Z-=B);
M696(CLRSPR-=Z) = ND3B(M695.Z-=C,M694.Z-=B,M693.Z-=A);
M694(M694.Z-=Z) = AND2B(M78.Z-=A,M82.Z-=B);
M393(M393.Z-=Z) = AND2B(M61.Z-=A,M82.Z-=B);
M605(M605.Z-=Z) = AND2B(M70.Z-=B,M61.Z-=A);
M632(M632.Z-=Z) = AND2B(M70.Z-=A,M95.Z-=B);
M634(M634.Z-=Z) = ND3B(M119.Z-=C,M632.Z-=A,M460.Z-=B);
M635(M635.Z-=Z) = NR2B(M634.Z-=B,M631.Z-=A);
M631(M631.Z-=Z) = ND3B(M61.Z-=C,M604.Z-=B,M441.Z-=A);
M604(M604.Z-=Z) = AND2B(M53.Z-=A,M57.Z-=B);
M653(M653.Z-=Z) = ND2B(M53.Z-=A,M57.Z-=B);
M655(M655.Z-=Z) = NR2B(M654.Z-=B,M653.Z-=A);
M656(M656.Z-=Z) = ND3B(M652.Z-=B,M651.Z-=A,M655.Z-=C);
```

```
M663(M663.Z--Z) = NR2B(M662.Z--B,M656.Z--A);
M662(M662.Z--Z) = ND3B(M658.Z--B,M657.Z--A,M661.Z--C);
M661(M661.Z--Z) = NR2B(M660.Z--B,M659.Z--A);
M659(M659.Z--Z) = ND2B(M123.Z--A,M129.Z--B);
M508(M508.Z--Z) = AND2B(M123.Z--A,M129.Z--B);
M461(M461.Z--Z) = AND2B(M123.Z--B,M119.Z--A);
M548(M548.Z--Z) = ND2B(M141.Z--B,M119.Z--A);
M550(M550.Z--Z) = NR2B(M549.Z--B,M548.Z--A);
M554(DUP--Z) = ND3B(M547.Z--A,M550.Z--B,M553.Z--C);
M553(M553.Z--Z) = NR2B(M552.Z--B,M551.Z--A);
M552(M552.Z--Z) = ND2B(M206.Z--A,M234.Z--B);
M401(M401.Z--Z) = AND2B(M210.Z--B,M206.Z--A);
M429(M429.Z--Z) = ND3B(M238.Z--C,M428.Z--B,M401.Z--A);
M430(M430.Z--Z) = NR2B(M429.Z--B,M426.Z--A);
M426(M426.Z--Z) = ND3B(M425.Z--B,M424.Z--A,M194.Z--C);
M424(M424.Z--Z) = AND2B(M149.Z--A,M161.Z--B);
M639(M639.Z--Z) = AND2B(M153.Z--A,M161.Z--B);
M641(M641.Z--Z) = ND3B(M198.Z--C,M640.Z--B,M639.Z--A);
M640(M640.Z--Z) = AND2B(M190.Z--A,M194.Z--B);
M666(M666.Z--Z) = ND2B(M198.Z--B,M194.Z--A);
M668(M668.Z--Z) = NR2B(M667.Z--B,M666.Z--A);
M669(M669.Z--Z) = ND3B(M664.Z--A,M513.Z--B,M668.Z--C);
M514(M514.Z--Z) = ND3B(M512.Z--B,M511.Z--A,M513.Z--C);
M511(M511.Z--Z) = AND2B(M153.Z--B,M149.Z--A);
M443(M443.Z--Z) = ND4B(M153.Z--D,M95.Z--A,M113.Z--B,M145.Z--C);
M444(M444.Z--Z) = NR2B(M443.Z--B,M442.Z--A);
M442(M442.Z--Z) = ND3B(M61.Z--C,M441.Z--B,M417.Z--A);
M441(M441.Z--Z) = AND2B(M49.Z--B,M27.Z--A);
M498(M498.Z--Z) = AND2B(M27.Z--A,M35.Z--B);
M418(M418.Z--Z) = AND2B(M35.Z--A,M45.Z--B);
M603(M603.Z--Z) = AND2B(M17.Z--A,M45.Z--B);
M606(M606.Z--Z) = ND3B(M605.Z--C,M604.Z--B,M603.Z--A);
M610(M610.Z--Z) = NR2B(M609.Z--B,M606.Z--A);
M609(M609.Z--Z) = ND3B(M123.Z--C,M600.Z--A,M507.Z--B);
M507(M507.Z--Z) = AND2B(M113.Z--A,M119.Z--B);
M460(M460.Z--Z) = AND2B(M113.Z--B,M103.Z--A);
M463(M463.Z--Z) = ND3B(M462.Z--C,M461.Z--B,M460.Z--A);
M464(M464.Z--Z) = NR2B(M463.Z--B,M459.Z--A);
M459(M459.Z--Z) = ND3B(M457.Z--B,M456.Z--A,M458.Z--C);
M456(M456.Z--Z) = AND2B(M17.Z--B,M11.Z--A);
M417(M417.Z--Z) = AND2B(M21.Z--B,M11.Z--A);
M419(M419.Z--Z) = ND3B(M49.Z--C,M418.Z--B,M417.Z--A);
M423(M423.Z--Z) = NR2B(M422.Z--B,M419.Z--A);
M422(M422.Z--Z) = ND3B(M129.Z--C,M421.Z--B,M420.Z--A);
M421(M421.Z--Z) = AND2B(M95.Z--A,M119.Z--B);
M504(M504.Z--Z) = AND3B(M87.Z--B,M78.Z--A,M95.Z--C);
M505(M505.Z--Z) = ND3B(M503.Z--B,M502.Z--A,M504.Z--C);
M506(M506.Z--Z) = NR2B(M505.Z--B,M501.Z--A);
M501(M501.Z--Z) = ND3B(M499.Z--B,M498.Z--A,M500.Z--C);
M499(M499.Z--Z) = AND2B(M41.Z--B,M39.Z--A);
M41(M41.Z--Z) = ND2B(M24.Z--B,M40.Z--A);
M71(M71.Z--Z) = ND3B(M9.Z--B,M15.Z--C,M40.Z--A);
M273(M273.Z--Z) = AND2B(M24.Z--A,M15.Z--B);
M47(M47.Z--Z) = AND3B(M2.Z--B,M3.Z--A,M24.Z--C);
M173(M173.Z--Z) = ND3B(M20.Z--C,M46.Z--A,M47.Z--B);
M528(CI--Z) = ND3B(M527.Z--B,M526.Z--A,M173.Z--C);
M527(M527.Z--Z) = AND2B(M77.Z--A,M103.Z--B);
M538(M538.Z--Z) = ND3B(M70.Z--A,M95.Z--B,M103.Z--C);
M540(M540.Z--Z) = NR2B(M539.Z--B,M538.Z--A);
M539(M539.Z--Z) = ND2B(M123.Z--A,M133.Z--B);
M636(M636.Z--Z) = AND2B(M123.Z--A,M133.Z--B);
M638(M638.Z--Z) = ND3B(M149.Z--C,M637.Z--B,M636.Z--A);
M642(M642.Z--Z) = NR2B(M641.Z--B,M638.Z--A);
M650(YADRSEL--Z) = ND3B(M635.Z--A,M642.Z--B,M649.Z--C);
M649(M649.Z--Z) = NR2B(M648.Z--B,M645.Z--A);
M648(M648.Z--Z) = ND3B(M647.Z--B,M646.Z--A,M361.Z--C);
M647(M647.Z--Z) = AND2B(M327.Z--A,M357.Z--B);
M357(M357.Z--Z) = ND3B(M356.Z--C,M272.Z--B,M239.Z--A);
M356(M356.Z--Z) = AND2B(M24.Z--A,M9.Z--B);
M314(M314.Z--Z) = AND3B(M24.Z--A,M9.Z--B,M630.Z--C);
M315(M315.Z--Z) = ND3C(M313.Z--B,M314.Z--C,M608.Z--A);
M313(M313.Z--Z) = AND2B(M613.Z--A,M615.Z--B);
M208(M208.Z--Z) = AND3B(M24.Z--B,M615.Z--A,M623.Z--C);
M210(M210.Z--Z) = ND3C(M187.Z--A,M208.Z--B,M633.Z--C);
```

```
    M278(M278.Z-=Z) = ND3B(M276.Z-=B,M275.Z-=A,M633.Z-=C);
    M406(M406.Z-=Z) = ND3B(M405.Z-=B,M404.Z-=A,M278.Z-=C);
    M407(M407.Z-=Z) = NR2B(M406.Z-=B,M403.Z-=A);
    M403(M403.Z-=Z) = ND3B(M401.Z-=B,M400.Z-=A,M402.Z-=C);
    M400(M400.Z-=Z) = AND2B(M177.Z-=A,M182.Z-=B);
    M182(M182.Z-=Z) = ND3B(M181.Z-=C,M179.Z-=A,M29.Z-=B);
    M311(M311.Z-=Z) = ND3C(M235.Z-=A,M181.Z-=C,M13.Z-=B);
    M307(M307.Z-=Z) = ND3C(M227.Z-=A,M69.Z-=C,M13.Z-=B);
    M624(M624.Z-=Z) = AND2B(M294.Z-=A,M307.Z-=B);
    M626(M626.Z-=Z) = ND3B(M625.Z-=C,M624.Z-=B,M475.Z-=A);
    M475(M475.Z-=Z) = AND2B(M266.Z-=A,M286.Z-=B);
    M518(M518.Z-=Z) = AND3B(M266.Z-=B,M286.Z-=C,M262.Z-=A);
    M519(M519.Z-=Z) = ND3B(M516.Z-=A,M402.Z-=B,M518.Z-=C);
    M472(M472.Z-=Z) = ND3B(M471.Z-=C,M470.Z-=B,M402.Z-=A);
    M473(M473.Z-=Z) = NR2B(M472.Z-=B,M468.Z-=A);
    M468(M468.Z-=Z) = ND3B(M466.Z-=B,M465.Z-=A,M467.Z-=C);
    M465(M465.Z-=Z) = AND2B(M149.Z-=B,M145.Z-=A);
    M509(M509.Z-=Z) = AND3B(M141.Z-=B,M137.Z-=A,M145.Z-=C);
    M510(M510.Z-=Z) = ND3B(M508.Z-=B,M507.Z-=A,M509.Z-=C);
    M515(M515.Z-=Z) = NR2B(M514.Z-=B,M510.Z-=A);
    M525(LD_-=Z) = ND3B(M506.Z-=A,M515.Z-=B,M524.Z-=C);
    M524(M524.Z-=Z) = NR2B(M523.Z-=B,M519.Z-=A);
    M523(M523.Z-=Z) = ND3B(M521.Z-=B,M476.Z-=A,M522.Z-=C);
    M521(M521.Z-=Z) = AND2B(M307.Z-=A,M342.Z-=B);
    M342(M342.Z-=Z) = ND3C(M217.Z-=C,M79.Z-=A,M80.Z-=B);
    M217(M217.Z-=Z) = AND2B(M9.Z-=A,M630.Z-=B);
    M181(M181.Z-=Z) = AND2B(M623.Z-=A,M630.Z-=B);
    M51(M51.Z-=Z) = AND3B(M616.Z-=B,M615.Z-=A,M623.Z-=C);
    M53(M53.Z-=Z) = ND3C(M52.Z-=C,M18.Z-=A,M51.Z-=B);
    M21(M21.Z-=Z) = ND3C(M20.Z-=C,M19.Z-=B,M18.Z-=A);
    M323(M323.Z-=Z) = ND3C(M29.Z-=B,M20.Z-=C,M608.Z-=A);
    M194(M194.Z-=Z) = ND3C(M192.Z-=B,M193.Z-=C,M608.Z-=A);
    M192(M192.Z-=Z) = AND2B(M2.Z-=B,M612.Z-=A);
    M121(M121.Z-=Z) = AND3B(M2.Z-=C,M5.Z-=A,M612.Z-=B);
    M123(M123.Z-=Z) = ND3C(M122.Z-=C,M67.Z-=A,M121.Z-=B);
    M70(M70.Z-=Z) = ND3C(M69.Z-=C,M67.Z-=A,M68.Z-=B);
    M177(M177.Z-=Z) = ND3B(M67.Z-=A,M68.Z-=B,M30.Z-=C);
    M186(M186.Z-=Z) = ND3B(M108.Z-=A,M184.Z-=B,M30.Z-=C);
    M161(M161.Z-=Z) = ND3C(M122.Z-=C,M108.Z-=A,M115.Z-=B);
    M119(M119.Z-=Z) = ND3C(M108.Z-=A,M115.Z-=B,M112.Z-=C);
    M129(M129.Z-=Z) = ND3C(M67.Z-=A,M125.Z-=B,M112.Z-=C);
    M462(M462.Z-=Z) = AND2B(M141.Z-=B,M129.Z-=A);
    M614(M614.Z-=Z) = ND3B(M466.Z-=C,M465.Z-=B,M462.Z-=A);
    M618(M618.Z-=Z) = NR2B(M617.Z-=B,M614.Z-=A);
    M628(CNVEN-=Z) = ND3B(M610.Z-=A,M618.Z-=B,M627.Z-=C);
    M627(M627.Z-=Z) = NR2B(M626.Z-=B,M622.Z-=A);
    M622(M622.Z-=Z) = ND3B(M621.Z-=C,M620.Z-=B,M619.Z-=A);
    M621(M621.Z-=Z) = AND2B(M254.Z-=A,M262.Z-=B);
    M431(M431.Z-=Z) = AND2B(M250.Z-=A,M262.Z-=B);
    M434(M434.Z-=Z) = ND3B(M433.Z-=C,M432.Z-=B,M431.Z-=A);
    M438(M438.Z-=Z) = NR2B(M437.Z-=B,M434.Z-=A);
    M439(STBIT30-=Z) = ND3B(M423.Z-=A,M430.Z-=B,M438.Z-=C);


  /* extractors ******************************/


  /* type converters *********************/

ANNOTATIONS
{
  BUS BUS_TYPE = "DOT";
}

END MODULE;


/* * * * * * *  Contents of NET file STBV2.NET  * * * * * * */

/*******************************************************/
```

```
/*  Netlist copyright (C) 1989 LSI Logic Corporation   */
/*******************************************************/
```

```
MODULE STBV2;

INPUTS      CP,RESET_,STBEN;
OUTPUTS     STB;

LEVEL FUNCTION;
DEFINE
  /* implicit connectors *******************/

    RESET_- = (RESET_);
    CP- = (CP);
    STBEN- = (STBEN);
    CP- = (CP);
    CP- = (CP);
    STB- = (STB);


  /* part instances **************************/

    U4(U4.Z-=Z) = ND2C(U1.Z-=A,CP-=B);
    U1(U1.Z-=Z) = ND3C(U3.Z-=A,U4.Z-=B,RESET_-=C);
    U3(U3.Z-=Z) = ND2B(U2.Z-=A,STBEN-=B);
    U2(U2.Z-=Z) = N1B(CP-=A);
    U0(STB-=Z) = AND2C(U1.Z-=B,CP-=A);


  /* extractors ******************************/


  /* type converters *********************/

ANNOTATIONS
{
  BUS BUS_TYPE = "DOT";
}

END MODULE;


/* * * * * * *  Contents of NET file XSEQV5FN.NET  * * * * * * */

/********************************************************/
/*  Netlist copyright (C) 1989 LSI Logic Corporation  */
/********************************************************/


MODULE XSEQV5FN;

INPUTS      CO,CP,DLY_POL,INC,RDY,RESET_,SPRCYC,STRT_FLG,WAIT;
OUTPUTS     CI,CLRSPR_,CLRXAU,CNVEN,DUP,ENSPR,ENXAU,EOC,FC,LC,
            LC_1,LD_,REQ,SC,SE,STB,YADRSEL,YINCEN;

LEVEL FUNCTION;
DEFINE
  /* implicit connectors *******************/

    RESET_- = (RESET_);
    BRESET_- = (BRESET_);
    CP- = (CP);
    CO- = (CO);
    DLY_POL- = (DLY_POL);
    INC- = (INC);
    RDY- = (RDY);
    SPRCYC- = (SPRCYC);
    STRT_FLG- = (STRT_FLG);
    WAIT- = (WAIT);
    BRESET_- = (BRESET_);
    CP- = (CP);
    STB- = (STB);
    CLRSPR_- = (CLRSPR_);
    BRESET_- = (BRESET_);
    BRESET_- = (BRESET_);
```

```
CP- = (CP);
CP- = (CP);
LD_- = (LD_);
ENXAU- = (ENXAU);
CI- = (CI);
FC- = (FC);
CNVEN- = (CNVEN);
LC- = (LC);
DUP- = (DUP);
YINCEN- = (YINCEN);
CLRXAU- = (CLRXAU);
YADRSEL- = (YADRSEL);
SE- = (SE);
ENSPR- = (ENSPR);
LC_1- = (LC_1);
EOC- = (EOC);
REQ- = (REQ);
SC- = (SC);


/* part instances ***************************/

U4(BRESET_-=Z) = B3A(RESET_-=A);
U5(STB-=STB) = STBV2(BRESET_-=RESET_,CP-=CP,U3.STBEN-=STBEN);
U3(U3.CLRSPR-=CLRSPR,U3.YINCEN-=YINCEN,U3.YADRSEL-=YADRSEL,
        U3.SE-=SE,U3.SC-=SC,U3.REQ-=REQ,U3.LD_-=LD_,U3.LC_1-=LC_1,
        U3.LC-=LC,U3.FC-=FC,U3.EOC-=EOC,U3.ENXAU-=ENXAU,
        U3.ENSPR-=ENSPR,U3.DUP-=DUP,U3.CNVEN-=CNVEN,
        U3.CLRXAU-=CLRXAU,U3.CI-=CI,U3.STBIT4O-=STBIT4O,
        U3.STBIT3O-=STBIT3O,U3.STBIT2O-=STBIT2O,U3.STBIT1O-=STBIT1O,
        U3.STBIT0O-=STBIT0O,U3.STBEN-=STBEN) = XSEQV5CR(CO-=CO,
        DLY_POL-=DLY_POL,INC-=INC,RDY-=RDY,SPRCYC-=SPRCYC,
        STRT_FLG-=STRT_FLG,WAIT-=WAIT,U3.STBIT4I-=STBIT4I,
        U3.STBIT3I-=STBIT3I,U3.STBIT2I-=STBIT2I,U3.STBIT1I-=STBIT1I,
        U3.STBIT0I-=STBIT0I);
U2(CLRSPR_-=QN) = FD4A(CP-=CP,U3.CLRSPR-=D,BRESET_-=SD);
U0.4(U0.Q-.4=Q) = FD2A(U0.D-.4=D,CP-=CP,BRESET_-=CD);
U0.3(U0.Q-.3=Q) = FD2A(U0.D-.3=D,CP-=CP,BRESET_-=CD);
U0.2(U0.Q-.2=Q) = FD2A(U0.D-.2=D,CP-=CP,BRESET_-=CD);
U0.1(U0.Q-.1=Q) = FD2A(U0.D-.1=D,CP-=CP,BRESET_-=CD);
U0.0(U0.Q-.0=Q) = FD2A(U0.D-.0=D,CP-=CP,BRESET_-=CD);
U1.15(U1.Q-.15=Q) = FD2A(BRESET_-=CD,U1.D-.15=D,CP-=CP);
U1.14(U1.Q-.14=Q) = FD2A(BRESET_-=CD,U1.D-.14=D,CP-=CP);
U1.13(U1.Q-.13=Q) = FD2A(BRESET_-=CD,U1.D-.13=D,CP-=CP);
U1.12(U1.Q-.12=Q) = FD2A(BRESET_-=CD,U1.D-.12=D,CP-=CP);
U1.11(U1.Q-.11=Q) = FD2A(BRESET_-=CD,U1.D-.11=D,CP-=CP);
U1.10(U1.Q-.10=Q) = FD2A(BRESET_-=CD,U1.D-.10=D,CP-=CP);
U1.9(U1.Q-.9=Q) = FD2A(BRESET_-=CD,U1.D-.9=D,CP-=CP);
U1.8(U1.Q-.8=Q) = FD2A(BRESET_-=CD,U1.D-.8=D,CP-=CP);
U1.7(U1.Q-.7=Q) = FD2A(BRESET_-=CD,U1.D-.7=D,CP-=CP);
U1.6(U1.Q-.6=Q) = FD2A(BRESET_-=CD,U1.D-.6=D,CP-=CP);
U1.5(U1.Q-.5=Q) = FD2A(BRESET_-=CD,U1.D-.5=D,CP-=CP);
U1.4(U1.Q-.4=Q) = FD2A(BRESET_-=CD,U1.D-.4=D,CP-=CP);
U1.3(U1.Q-.3=Q) = FD2A(BRESET_-=CD,U1.D-.3=D,CP-=CP);
U1.2(U1.Q-.2=Q) = FD2A(BRESET_-=CD,U1.D-.2=D,CP-=CP);
U1.1(U1.Q-.1=Q) = FD2A(BRESET_-=CD,U1.D-.1=D,CP-=CP);
U1.0(U1.Q-.0=Q) = FD2A(BRESET_-=CD,U1.D-.0=D,CP-=CP);


/* extractors ******************************/

U1.D-.14 = (U3.YADRSEL-);
U1.D-.9 = (U3.LC_1-);
U1.D-.11 = (U3.REQ-);
U1.D-.4 = (U3.ENSPR-);
U1.D-.10 = (U3.LD_-);
U1.D-.12 = (U3.SC-);
U1.D-.15 = (U3.YINCEN-);
U1.D-.8 = (U3.LC-);
U1.D-.1 = (U3.CLRXAU-);
U1.D-.13 = (U3.SE-);
U1.D-.7 = (U3.FC-);
U1.D-.5 = (U3.ENXAU-);
U1.D-.6 = (U3.EOC-);
```

```
    U1.D-.2 = (U3.CNVEN-);
    U1.D-.3 = (U3.DUP-);
    U1.D-.0 = (U3.CI-);
    U0.D-.3 = (U3.STBIT3O-);
    U0.D-.2 = (U3.STBIT2O-);
    U0.D-.1 = (U3.STBIT1O-);
    U0.D-.4 = (U3.STBIT4O-);
    U0.D-.0 = (U3.STBIT0O-);
    U0.Q-.1 = (U3.STBIT1I-);
    U0.Q-.3 = (U3.STBIT3I-);
    U0.Q-.4 = (U3.STBIT4I-);
    U0.Q-.2 = (U3.STBIT2I-);
    U0.Q-.0 = (U3.STBIT0I-);
    U1.Q-.10 = (LD_-);
    U1.Q-.5 = (ENXAU-);
    U1.Q-.0 = (CI-);
    U1.Q-.7 = (FC-);
    U1.Q-.2 = (CNVEN-);
    U1.Q-.8 = (LC-);
    U1.Q-.3 = (DUP-);
    U1.Q-.15 = (YINCEN-);
    U1.Q-.1 = (CLRXAU-);
    U1.Q-.14 = (YADRSEL-);
    U1.Q-.13 = (SE-);
    U1.Q-.4 = (ENSPR-);
    U1.Q-.9 = (LC_1-);
    U1.Q-.6 = (EOC-);
    U1.Q-.11 = (REQ-);
    U1.Q-.12 = (SC-);

  /* type converters ********************/

ANNOTATIONS
{
  BUS BUS_TYPE = "DOT";
}

END MODULE;


/* * * * * * *  Contents of NET file X_CNTV5.NET  * * * * * * */

/*****************************************************/
/*  Netlist copyright (C) 1989 LSI Logic Corporation  */
/*****************************************************/


MODULE X_CNTV5;

INPUTS        CP,CS_,DLY_POL,HLT,INC,INROW,NOS.1,NOS.0,PDI.15,
              PDI.14,PDI.13,PDI.12,PDI.11,PDI.10,PDI.9,PDI.8,PDI.7,
              PDI.6,PDI.5,PDI.4,PDI.3,PDI.2,PDI.1,PDI.0,PXL_EN,RDY,
              RESET_,SPRCYC,STRT_FLG,S_MODE,WAIT,WR_,YDWN,YUP;
OUTPUTS       CLRSPR_,CLRXAU,CMAGEN,DUP,ENSPR,ENXAU,EOC,FIRST,LAST,
              LSTMINUS1,PSE,REQ,REQ_O,S,SE,SECOND,STB,YADRSEL,
              YINCEN;

LEVEL FUNCTION;
DEFINE
  /* implicit connectors *******************/

    WR_- = (WR_);
    CLRSPR_- = (CLRSPR_);
    ENSPR- = (ENSPR);
    RDY- = (RDY);
    INC- = (INC);
    SPRCYC- = (SPRCYC);
    YINCEN- = (YINCEN);
    FIRST- = (FIRST);
    SECOND- = (SECOND);
    LSTMINUS1- = (LSTMINUS1);
    LAST- = (LAST);
    YADRSEL- = (YADRSEL);
    EOC- = (EOC);
```

```
ENXAU- = (ENXAU);
CLRXAU- = (CLRXAU);
PSE- = (PSE);
SE- = (SE);
DLY_POL- = (DLY_POL);
CNVEN- = (CNVEN);
CNVEN- = (CNVEN);
CMAGEN- = (CMAGEN);
CP- = (CP);
RESET_- = (RESET_);
BRESET_- = (BRESET_);
BRESET_- = (BRESET_);
CP- = (CP);
REQ_O- = (REQ_O);
BRESET_- = (BRESET_);
BRESET_- = (BRESET_);
DUP- = (DUP);
CP- = (CP);
SMPWT- = (SMPWT);
SMPWT- = (SMPWT);
BRESET_- = (BRESET_);
REQ- = (REQ);
REQ- = (REQ);
S- = (S);
CP- = (CP);
SMPWT- = (SMPWT);
SMPWT- = (SMPWT);
SMPWT- = (SMPWT);
DLY_POL- = (DLY_POL);
NOS-.1 = (NOS.1);
NOS-.0 = (NOS.0);
NOS-.1 = (NOS.1);
NOS-.0 = (NOS.0);
NOS-.1 = (NOS.1);
NOS-.0 = (NOS.0);
BRESET_- = (BRESET_);
S_MODE- = (S_MODE);
YDWN- = (YDWN);
YUP- = (YUP);
CO- = (CO);
CO- = (CO);
BRESET_- = (BRESET_);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
BRESET_- = (BRESET_);
CP- = (CP);
BRESET_- = (BRESET_);
BRESET_- = (BRESET_);
INROW- = (INROW);
HLT- = (HLT);
WAIT- = (WAIT);
WAIT- = (WAIT);
CP- = (CP);
CP- = (CP);
DLY_POL- = (DLY_POL);
DLY_POL- = (DLY_POL);
PXL_EN- = (PXL_EN);
STB- = (STB);
STRT_FLG- = (STRT_FLG);
CS_- = (CS_);
```

```
/* part instances ***************************/

  U2(BRESET_-=Z) = B3A(RESET_-=A);
  U14(U14.Z-=Z) = AND2B(U12.CNV-=A,U10.CNVEN-=B);
  U13(REQ_O-=Q) = FD2A(CP-=CP,U14.Z-=D,BRESET_-=CD);
  U6(SMPWT-=Z) = B3A(U0.Q-=A);
  U16(S-=Z) = N1C(U15.QN-=A);
  U15(U15.QN-=QN,U15.Q-=Q) = FD2SA(BRESET_-=CD,REQ-=D,U15.Q-=TI,
        CP-=CP,SMPWT-=TE);
  U11(DUP-=DUP) = DUPDLY(U5.DUP-=D,BRESET_-=RESET_,CP-=CP,SMPWT-=WAIT,
        DLY_POL-=DLY_POL,NOS-.1=NOS.1,NOS-.0=NOS.0);
  U19(U19.Z-=Z) = AND2A(YDWN-=B,YUP-=A);
  U17(U17.Z-=Z) = N1B(U18.Z-=A);
  U18(U18.Z-=Z) = MX21LB(S_MODE-=S,U19.Z-=B,CO-=A);
  U7(U7.Z-=Z) = AND2B(U1.Z-=A,BRESET_-=B);
  U8.15(U8.Q-.15=Q) = FD2A(U1.Z-=CP,PDI-.15=D,BRESET_-=CD);
  U8.14(U8.Q-.14=Q) = FD2A(U1.Z-=CP,PDI-.14=D,BRESET_-=CD);
  U8.13(U8.Q-.13=Q) = FD2A(U1.Z-=CP,PDI-.13=D,BRESET_-=CD);
  U8.12(U8.Q-.12=Q) = FD2A(U1.Z-=CP,PDI-.12=D,BRESET_-=CD);
  U8.11(U8.Q-.11=Q) = FD2A(U1.Z-=CP,PDI-.11=D,BRESET_-=CD);
  U8.10(U8.Q-.10=Q) = FD2A(U1.Z-=CP,PDI-.10=D,BRESET_-=CD);
  U8.9(U8.Q-.9=Q) = FD2A(U1.Z-=CP,PDI-.9=D,BRESET_-=CD);
  U8.8(U8.Q-.8=Q) = FD2A(U1.Z-=CP,PDI-.8=D,BRESET_-=CD);
  U8.7(U8.Q-.7=Q) = FD2A(U1.Z-=CP,PDI-.7=D,BRESET_-=CD);
  U8.6(U8.Q-.6=Q) = FD2A(U1.Z-=CP,PDI-.6=D,BRESET_-=CD);
  U8.5(U8.Q-.5=Q) = FD2A(U1.Z-=CP,PDI-.5=D,BRESET_-=CD);
  U8.4(U8.Q-.4=Q) = FD2A(U1.Z-=CP,PDI-.4=D,BRESET_-=CD);
  U8.3(U8.Q-.3=Q) = FD2A(U1.Z-=CP,PDI-.3=D,BRESET_-=CD);
  U8.2(U8.Q-.2=Q) = FD2A(U1.Z-=CP,PDI-.2=D,BRESET_-=CD);
  U8.1(U8.Q-.1=Q) = FD2A(U1.Z-=CP,PDI-.1=D,BRESET_-=CD);
  U8.0(U8.Q-.0=Q) = FD2A(U1.Z-=CP,PDI-.0=D,BRESET_-=CD);
  U9(CO-=CO) = CNT16D(U8.Q-.15=DI.15,U8.Q-.14=DI.14,U8.Q-.13=DI.13,
        U8.Q-.12=DI.12,U8.Q-.11=DI.11,U8.Q-.10=DI.10,U8.Q-.9=DI.9,
        U8.Q-.8=DI.8,U8.Q-.7=DI.7,U8.Q-.6=DI.6,U8.Q-.5=DI.5,
        U8.Q-.4=DI.4,U8.Q-.3=DI.3,U8.Q-.2=DI.2,U8.Q-.1=DI.1,
        U8.Q-.0=DI.0,BRESET_-=RESET_,U5.LD_-=LD_,U5.CI-=CI,
        CP-=CP);
  U4(U4.Z-=Z) = N1B(INROW-=A);
  U3(U3.Z-=Z) = OR3C(U4.Z-=A,HLT-=B,WAIT-=C);
  U0(U0.Q-=Q) = FD2A(BRESET_-=CD,WAIT-=D,CP-=CP);
  U10(U10.CNVEN-=CNVEN,CMAGEN-=CMAGEN) = CNVDLY(CNVEN-=D,BRESET_-=RESET_,
        NOS-.1=NOS.1,NOS-.0=NOS.0,DLY_POL-=DLY_POL,SMPWT-=WAIT,
        CP-=CP);
  U12(U12.CNV-=CNV,PSE-=PSE,SE-=SE) = SEDLYV1(BRESET_-=RESET_,
        NOS-.1=NOS.1,NOS-.0=NOS.0,CP-=CP,SMPWT-=WAIT,DLY_POL-=DLY_POL,
        U5.SE-=D,PXL_EN-=PXL_EN);
  U5(U5.DUP-=DUP,CLRSPR_-=CLRSPR_,ENSPR-=ENSPR,U5.LD_-=LD_,
        U5.CI-=CI,CNVEN-=CNVEN,YINCEN-=YINCEN,FIRST-=FC,
        SECOND-=SC,LSTMINUS1-=LC_1,LAST-=LC,REQ-=REQ,YADRSEL-=YADRSEL,
        EOC-=EOC,ENXAU-=ENXAU,CLRXAU-=CLRXAU,U5.SE-=SE,STB-=STB)
         = XSEQV5FN(U17.Z-=CO,U7.Z-=RESET_,U3.Z-=WAIT,RDY-=RDY,
        INC-=INC,SPRCYC-=SPRCYC,STRT_FLG-=STRT_FLG,DLY_POL-=DLY_POL,
        CP-=CP);
  U1(U1.Z-=Z) = OR3B(CS_-=C,WR_-=B,STRT_FLG-=A);


/* extractors ******************************/


/* type converters *********************/

ANNOTATIONS
{
  BUS BUS_TYPE = "DOT";
}

END MODULE;


/* * * * * * *  Contents of NET file SPRSEQV2CR.NET  * * * * * * */

/*******************************************************/
/*  Netlist copyright (C) 1989 LSI Logic Corporation   */
/*******************************************************/
```

```
MODULE SPRSEQV2CR;

INPUTS      EN,EOCOL,LIM,NS0,NS1,RDY,REQ,STBIT0I,STBIT1I,WAIT;
OUTPUTS     LS_1,SPR0,SPR1,SPRCYC,STBIT0O,STBIT1O;

LEVEL FUNCTION;
DEFINE
  /* implicit connectors *******************/

    SPR1- = (SPR1);
    SPR0- = (SPR0);
    REQ- = (REQ);
    STBIT1I- = (STBIT1I);
    EN- = (EN);
    LIM- = (LIM);
    LS_1- = (LS_1);
    STBIT0I- = (STBIT0I);
    STBIT0O- = (STBIT0O);
    NS0- = (NS0);
    RDY- = (RDY);
    EOCOL- = (EOCOL);
    SPRCYC- = (SPRCYC);
    WAIT- = (WAIT);
    STBIT1O- = (STBIT1O);
    NS1- = (NS1);


  /* part instances **************************/

    M14(M14.Z-=Z) = N1C(REQ-=A);
    M169(M169.Z-=Z) = N1C(M19.Z-=A);
    M19(M19.Z-=Z) = N1D(STBIT1I-=A);
    M81(M81.Z-=Z) = ND3B(M50.Z-=C,M27.Z-=B,M26.Z-=A);
    M64(M64.Z-=Z) = AND2B(M169.Z-=B,M177.Z-=A);
    M83(M83.Z-=Z) = ND2B(WAIT-=A,M169.Z-=B);
    M34(M34.Z-=Z) = N1C(EN-=A);
    M1(M1.Z-=Z) = N1C(LIM-=A);
    M140(M140.Z-=Z) = AND2B(M1.Z-=A,WAIT-=B);
    M7(M7.Z-=Z) = N1C(WAIT-=A);
    M6(M6.Z-=Z) = AND2C(M1.Z-=A,M176.Z-=B);
    M27(M27.Z-=Z) = AND2C(M7.Z-=B,M176.Z-=A);
    M176(M176.Z-=Z) = N1C(M34.Z-=A);
    M10(M10.Z-=Z) = N1C(EOCOL-=A);
    M177(M177.Z-=Z) = N1C(M31.Z-=A);
    M138(M138.Z-=Z) = ND3B(M137.Z-=B,M125.Z-=A,M19.Z-=C);
    M174(M174.Z-=Z) = N1C(M3.Z-=A);
    M26(M26.Z-=Z) = AND2C(M1.Z-=B,M174.Z-=A);
    M2(M2.Z-=Z) = AND2B(M3.Z-=B,M171.Z-=A);
    M20(M20.Z-=Z) = AND3B(M14.Z-=A,M179.Z-=B,M19.Z-=C);
    M186(M186.Z-=Z) = AND2B(M96.Z-=B,M92.Z-=A);
    M25(M25.Z-=Z) = ND3B(M18.Z-=B,M24.Z-=C,M17.Z-=A);
    M179(M179.Z-=Z) = N1C(M28.Z-=A);
    M76(M76.Z-=Z) = AND2B(M19.Z-=B,M28.Z-=A);
    M28(M28.Z-=Z) = N1D(STBIT0I-=A);
    M41(M41.Z-=Z) = AND2C(M1.Z-=B,M171.Z-=A);
    M47(M47.Z-=Z) = ND3B(M46.Z-=C,M41.Z-=A,M27.Z-=B);
    M42(M42.Z-=Z) = AND2B(M34.Z-=A,M28.Z-=B);
    M43(M43.Z-=Z) = ND3B(M41.Z-=A,M42.Z-=B,M19.Z-=C);
    M87(M87.Z-=Z) = ND3B(M29.Z-=C,M41.Z-=A,M27.Z-=B);
    M29(M29.Z-=Z) = AND3B(M28.Z-=B,M177.Z-=A,M19.Z-=C);
    M39(M39.Z-=Z) = AND3B(M28.Z-=B,M177.Z-=A,M169.Z-=C);
    M46(M46.Z-=Z) = AND3C(M28.Z-=B,M14.Z-=A,M19.Z-=C);
    M96(M96.Z-=Z) = ND3B(M46.Z-=C,M18.Z-=B,M89.Z-=A);
    M18(M18.Z-=Z) = AND3C(EOCOL-=A,M176.Z-=B,M7.Z-=C);
    M51(M51.Z-=Z) = ND3B(M18.Z-=B,M50.Z-=C,M37.Z-=A);
    M40(M40.Z-=Z) = ND3B(M18.Z-=B,M39.Z-=C,M37.Z-=A);
    M185(M185.Z-=Z) = AND2B(M51.Z-=B,M40.Z-=A);
    M187(LS_1-=Z) = ND3B(M186.Z-=C,M185.Z-=B,M184.Z-=A);
    M184(M184.Z-=Z) = AND2B(M25.Z-=B,M21.Z-=A);
    M175(M175.Z-=Z) = N1C(M1.Z-=A);
    M59(M59.Z-=Z) = ND4B(M175.Z-=A,M10.Z-=B,M179.Z-=C,M169.Z-=D);
    M61(M61.Z-=Z) = ND4B(M174.Z-=A,M175.Z-=B,M10.Z-=C,M169.Z-=D);
    M11(M11.Z-=Z) = ND3B(M175.Z-=A,M10.Z-=B,M179.Z-=C);
    M162(M162.Z-=Z) = NR2B(M160.Z-=A,M161.Z-=B);
    M163(STBIT0O-=Z) = ND3B(M156.Z-=A,M162.Z-=C,M159.Z-=B);
```

```
M156(M156.Z-=Z) = NR2C(M155.Z-=B,M154.Z-=A);
M154(M154.Z-=Z) = ND2B(M21.Z-=B,M11.Z-=A);
M21(M21.Z-=Z) = ND3B(M18.Z-=B,M20.Z-=C,M17.Z-=A);
M75(M75.Z-=Z) = AND2B(M31.Z-=A,M178.Z-=B);
M178(M178.Z-=Z) = N1C(M14.Z-=A);
M127(M127.Z-=Z) = AND2B(M19.Z-=B,M178.Z-=A);
M115(M115.Z-=Z) = AND3B(M178.Z-=B,M177.Z-=A,M169.Z-=C);
M116(M116.Z-=Z) = ND3B(M115.Z-=C,M114.Z-=B,M17.Z-=A);
M17(M17.Z-=Z) = AND3B(M174.Z-=B,M171.Z-=A,M175.Z-=C);
M171(M171.Z-=Z) = N1C(M36.Z-=A);
M121(M121.Z-=Z) = AND2B(M36.Z-=A,M174.Z-=B);
M36(M36.Z-=Z) = N1C(NS0-=A);
M37(M37.Z-=Z) = AND3B(M174.Z-=B,M175.Z-=C,M36.Z-=A);
M125(M125.Z-=Z) = AND2B(M171.Z-=A,M174.Z-=B);
M128(M128.Z-=Z) = ND3B(M127.Z-=C,M126.Z-=B,M125.Z-=A);
M126(M126.Z-=Z) = AND2B(M31.Z-=B,M1.Z-=A);
M31(M31.Z-=Z) = N1C(RDY-=A);
M32(M32.Z-=Z) = ND3B(M178.Z-=B,M179.Z-=C,M31.Z-=A);
M155(M155.Z-=Z) = ND2B(M25.Z-=A,M32.Z-=B);
M144(M144.Z-=Z) = ND3B(M21.Z-=A,M25.Z-=B,M30.Z-=C);
M146(M146.Z-=Z) = NR2C(M145.Z-=B,M144.Z-=A);
M145(M145.Z-=Z) = ND3B(M47.Z-=A,M60.Z-=C,M59.Z-=B);
M60(M60.Z-=Z) = ND4B(M171.Z-=A,M175.Z-=B,M10.Z-=C,M169.Z-=D);
M114(M114.Z-=Z) = AND3B(M176.Z-=B,M7.Z-=C,M10.Z-=A);
M97(M97.Z-=Z) = AND3B(EOCOL-=B,M174.Z-=A,M176.Z-=C);
M52(M52.Z-=Z) = AND2B(M174.Z-=A,EOCOL-=B);
M104(M104.Z-=Z) = ND3B(M46.Z-=C,M27.Z-=B,M52.Z-=A);
M150(M150.Z-=Z) = ND3B(M96.Z-=A,M100.Z-=B,M104.Z-=C);
M170(M170.Z-=Z) = ND3B(M96.Z-=A,M108.Z-=C,M100.Z-=B);
M100(M100.Z-=Z) = ND3B(M98.Z-=B,M97.Z-=A,M76.Z-=C);
M98(M98.Z-=Z) = AND3B(M7.Z-=A,M178.Z-=C,M177.Z-=B);
M118(M118.Z-=Z) = AND3B(M14.Z-=C,M176.Z-=A,M7.Z-=B);
M111(M111.Z-=Z) = AND2B(M19.Z-=B,M179.Z-=A);
M120(M120.Z-=Z) = ND3B(M118.Z-=B,M109.Z-=A,M111.Z-=C);
M109(M109.Z-=Z) = AND3B(M174.Z-=B,M171.Z-=A,M1.Z-=C);
M137(M137.Z-=Z) = AND2B(M34.Z-=B,M1.Z-=A);
M88(M88.Z-=Z) = ND2B(M34.Z-=A,M169.Z-=B);
M33(M33.Z-=Z) = ND2B(WAIT-=A,M179.Z-=B);
M157(M157.Z-=Z) = ND2B(M33.Z-=A,M35.Z-=B);
M35(M35.Z-=Z) = ND2B(M179.Z-=B,M34.Z-=A);
M142(M142.Z-=Z) = ND4B(M174.Z-=A,M28.Z-=D,M1.Z-=B,M34.Z-=C);
M190(M190.Z-=Z) = NR2B(M188.Z-=A,M189.Z-=B);
M193(M193.Z-=Z) = NR2B(M192.Z-=B,M191.Z-=A);
M197(SPRCYC-=Z) = ND3B(M190.Z-=A,M193.Z-=B,M196.Z-=C);
M196(M196.Z-=Z) = NR2B(M195.Z-=B,M194.Z-=A);
M195(M195.Z-=Z) = ND2B(M142.Z-=A,M143.Z-=B);
M143(M143.Z-=Z) = ND4B(WAIT-=C,M174.Z-=A,M28.Z-=D,M1.Z-=B);
M57(M57.Z-=Z) = AND2B(M28.Z-=B,WAIT-=A);
M58(M58.Z-=Z) = ND3B(M41.Z-=A,M57.Z-=B,M19.Z-=C);
M189(M189.Z-=Z) = ND3B(M43.Z-=A,M58.Z-=B,M65.Z-=C);
M65(M65.Z-=Z) = ND3B(M41.Z-=A,M27.Z-=B,M64.Z-=C);
M73(M73.Z-=Z) = ND3B(M39.Z-=C,M27.Z-=B,M26.Z-=A);
M160(M160.Z-=Z) = ND2B(M73.Z-=A,M81.Z-=B);
M180(M180.Z-=Z) = ND3B(M112.Z-=C,M73.Z-=A,M81.Z-=B);
M112(M112.Z-=Z) = ND3B(M110.Z-=B,M109.Z-=A,M111.Z-=C);
M110(M110.Z-=Z) = AND3B(M176.Z-=A,M7.Z-=B,M177.Z-=C);
M8(M8.Z-=Z) = AND3B(M7.Z-=A,M177.Z-=B,M179.Z-=C);
M24(M24.Z-=Z) = AND3B(M177.Z-=A,M179.Z-=B,M19.Z-=C);
M141(M141.Z-=Z) = ND3B(M140.Z-=B,M125.Z-=A,M19.Z-=C);
M194(M194.Z-=Z) = ND3B(M135.Z-=A,M138.Z-=B,M141.Z-=C);
M135(M135.Z-=Z) = ND3B(M15.Z-=C,M6.Z-=B,M121.Z-=A);
M15(M15.Z-=Z) = AND3B(M14.Z-=B,M7.Z-=A,M179.Z-=C);
M68(M68.Z-=Z) = AND2B(M169.Z-=B,M14.Z-=A);
M69(M69.Z-=Z) = ND3B(M41.Z-=A,M27.Z-=B,M68.Z-=C);
M191(M191.Z-=Z) = ND3B(M69.Z-=A,M108.Z-=C,M77.Z-=B);
M77(M77.Z-=Z) = ND3B(M41.Z-=A,M76.Z-=C,M75.Z-=B);
M131(M131.Z-=Z) = ND3B(M28.Z-=C,M26.Z-=A,M75.Z-=B);
M192(M192.Z-=Z) = ND3B(M124.Z-=A,M128.Z-=B,M131.Z-=C);
M124(M124.Z-=Z) = ND3B(M8.Z-=C,M6.Z-=B,M121.Z-=A);
M9(M9.Z-=Z) = ND3B(M8.Z-=C,M6.Z-=B,M2.Z-=A);
M16(M16.Z-=Z) = ND3B(M15.Z-=C,M6.Z-=B,M2.Z-=A);
M188(M188.Z-=Z) = ND3B(M9.Z-=A,M16.Z-=B,M30.Z-=C);
M30(M30.Z-=Z) = ND3B(M29.Z-=C,M27.Z-=B,M26.Z-=A);
M108(M108.Z-=Z) = ND3B(M46.Z-=C,M27.Z-=B,M26.Z-=A);
```

```
    M151(M151.Z-=Z) = ND3B(M112.Z-=B,M108.Z-=A,M120.Z-=C);
    M152(M152.Z-=Z) = NR2B(M150.Z-=A,M151.Z-=B);
    M153(STBIT10-=Z) = ND3B(M146.Z-=A,M152.Z-=C,M149.Z-=B);
    M173(SPR0-=Z) = ND3B(M146.Z-=A,M172.Z-=C,M149.Z-=B);
    M172(M172.Z-=Z) = NR2B(M170.Z-=A,M161.Z-=B);
    M161(M161.Z-=Z) = ND2B(M112.Z-=A,M120.Z-=B);
    M181(M181.Z-=Z) = ND2B(M116.Z-=A,M120.Z-=B);
    M182(M182.Z-=Z) = NR2B(M180.Z-=A,M181.Z-=B);
    M183(SPR1-=Z) = ND3B(M156.Z-=A,M182.Z-=C,M159.Z-=B);
    M159(M159.Z-=Z) = NR2C(M158.Z-=B,M157.Z-=A);
    M158(M158.Z-=Z) = ND2B(M40.Z-=A,M55.Z-=B);
    M55(M55.Z-=Z) = ND3B(M50.Z-=C,M27.Z-=B,M52.Z-=A);
    M50(M50.Z-=Z) = AND3B(M28.Z-=B,M14.Z-=A,M169.Z-=C);
    M82(M82.Z-=Z) = ND3B(M178.Z-=B,M31.Z-=A,M169.Z-=C);
    M147(M147.Z-=Z) = ND3B(M61.Z-=A,M83.Z-=C,M82.Z-=B);
    M149(M149.Z-=Z) = NR2C(M148.Z-=B,M147.Z-=A);
    M148(M148.Z-=Z) = ND3B(M92.Z-=C,M87.Z-=A,M88.Z-=B);
    M92(M92.Z-=Z) = ND3B(M18.Z-=B,M89.Z-=A,M29.Z-=C);
    M89(M89.Z-=Z) = AND3B(M171.Z-=A,M175.Z-=C,M3.Z-=B);
    M3(M3.Z-=Z) = N1C(NS1-=A);

  /* extractors ******************************/


  /* type converters *********************/

ANNOTATIONS
{
  BUS BUS_TYPE = "DOT";
}

END MODULE;


/* * * * * * *  Contents of NET file SPRSEQV2FN.NET  * * * * * * */

/*******************************************************/
/*  Netlist copyright (C) 1989 LSI Logic Corporation  */
/*******************************************************/


MODULE SPRSEQV2FN;

INPUTS      CP,EN,ENDCOL,HLT,INROW,LIM,NS.1,NS.0,RDY,REQ,RESET_,
            WAIT;
OUTPUTS     LS_1,SPR.1,SPR.0,SPRCYC;

LEVEL FUNCTION;
DEFINE
  /* implicit connectors *******************/

    LIM- = (LIM);
    LIM- = (LIM);
    ENDCOL- = (ENDCOL);
    EN- = (EN);
    REQ- = (REQ);
    WAIT- = (WAIT);
    HLT- = (HLT);
    INROW- = (INROW);
    RESET_- = (RESET_);
    SPR-.1 = (SPR.1);
    SPR-.0 = (SPR.0);
    LS_1- = (LS_1);
    RESET_- = (RESET_);
    CP- = (CP);
    CP- = (CP);
    CP- = (CP);
    RDY- = (RDY);
    NS-.1 = (NS.1);
    NS-.0 = (NS.0);
    NS-.1 = (NS.1);
```

```
    NS-.0 = (NS.0);
    RESET_- = (RESET_);
    RESET_- = (RESET_);
    SPRCYC- = (SPRCYC);


  /* part instances ***************************/

    U1(U1.Z-=Z) = N1A(INROW-=A);
    U2(U2.Z-=Z) = OR3C(WAIT-=A,HLT-=B,U1.Z-=C);
    U4(U4.Q-=Q) = FD2A(U0.STBIT0O-=D,RESET_-=CD,CP-=CP);
    U5.2(U5.Q-.2=Q) = FD2A(RESET_-=CD,U5.D-.2=D,CP-=CP);
    U5.1(U5.Q-.1=Q) = FD2A(RESET_-=CD,U5.D-.1=D,CP-=CP);
    U5.0(U5.Q-.0=Q) = FD2A(RESET_-=CD,U5.D-.0=D,CP-=CP);
    U3(U3.Q-=Q) = FD2A(U0.STBIT1O-=D,RESET_-=CD,CP-=CP);
    U0(U0.LS_1-=LS_1,U0.SPR0-=SPR0,U0.SPR1-=SPR1,U0.STBIT1O-=STBIT1O,
            U0.STBIT0O-=STBIT0O,U0.SPRCYC-=SPRCYC) = SPRSEQV2CR(
            LIM-=LIM,ENDCOL-=EOCOL,EN-=EN,REQ-=REQ,U0.NS0-=NS0,
            U0.NS1-=NS1,U2.Z-=WAIT,U4.Q-=STBIT0I,U3.Q-=STBIT1I,
            RDY-=RDY);
    U8(U8.Z-=Z) = OR2A(U8.A-=A,U8.B-=B);
    U7(U7.Z-=Z) = N1A(U8.Z-=A);
    U11(U11.Z-=Z) = OR2A(RESET_-=B,U8.Z-=A);
    U10(U10.Z-=Z) = OR3A(LIM-=B,U7.Z-=C,RESET_-=A);
    U9(SPRCYC-=Q) = FD3A(U0.SPRCYC-=D,CP-=CP,U11.Z-=CD,U10.Z-=SD);


  /* extractors ******************************/

    NS-.0 = (U8.A-);
    NS-.1 = (U0.NS1-);
    U5.Q-.2 = (SPR-.1);
    U5.Q-.1 = (SPR-.0);
    U5.Q-.0 = (LS_1-);
    U5.D-.0 = (U0.LS_1-);
    U5.D-.1 = (U0.SPR0-);
    U5.D-.2 = (U0.SPR1-);
    NS-.0 = (U0.NS0-);
    NS-.1 = (U8.B-);


  /* type converters *********************/

ANNOTATIONS
{
  BUS BUS_TYPE = "DOT";
}

END MODULE;


/* * * * * * *  Contents of NET file CNVCNTV4.NET  * * * * * * */

/*******************************************************/
/*  Netlist copyright (C) 1989 LSI Logic Corporation  */
/*******************************************************/


MODULE CNVCNTV4;

INPUTS        CP,DLY_POL,EOR,INCX,INCY,INT_GT_1IN,MR_CS_,PDI.15,
              PDI.14,PDI.13,PDI.12,PDI.11,PDI.10,PDI.9,PDI.8,PDI.7,
              PDI.6,PDI.5,PDI.4,PDI.3,PDI.2,PDI.1,PDI.0,PXL_EN,RDY,
              RESET_,STOP,STRT,S_MODE,WAIT,WR_,XDIM_CS_,YDIM_CS_,
              YDWN,YUP;
OUTPUTS       CLRXAU,CLRYAU,CMAGEN,DUP,ENXAU,ENYAU,EOC,FRSTROW,HLT,
              LIM,LSTROW,LSTROW_1,LS_1,NOS.1,NOS.0,PSE,REQ,REQ_O,S,
              SCNDCOL,SCNDROW,SE,SPR.1,SPR.0,SPRCYC,STB,STF,YADRSEL,
              YINCEN;

LEVEL FUNCTION;
DEFINE
  /* implicit connectors *******************/
```

```
PXL_EN- = (PXL_EN);
INT_GT_1IN- = (INT_GT_1IN);
DLY_POL- = (DLY_POL);
XDIM_CS_- = (XDIM_CS_);
INCX- = (INCX);
SCNDCOL- = (SCNDCOL);
ENXAU- = (ENXAU);
CLRXAU- = (CLRXAU);
PSE- = (PSE);
STB- = (STB);
REQ_O- = (REQ_O);
YADRSEL- = (YADRSEL);
S- = (S);
DUP- = (DUP);
YINCEN- = (YINCEN);
CMAGEN- = (CMAGEN);
SE- = (SE);
YUP- = (YUP);
YDWN- = (YDWN);
S_MODE- = (S_MODE);
ENDCOL- = (ENDCOL);
ENDCOL- = (ENDCOL);
REQ- = (REQ);
REQ- = (REQ);
RDY- = (RDY);
RDY- = (RDY);
ENSPR- = (ENSPR);
ENSPR- = (ENSPR);
LS_1- = (LS_1);
SPRCYC- = (SPRCYC);
SPR-.1 = (SPR.1);
SPR-.0 = (SPR.0);
RESET_- = (RESET_);
BRESET_- = (BRESET_);
BRESET_- = (BRESET_);
STRT- = (STRT);
STOP- = (STOP);
STF- = (STF);
HLT- = (HLT);
HLT- = (HLT);
HLT- = (HLT);
ENYAU- = (ENYAU);
CLRYAU- = (CLRYAU);
EOC- = (EOC);
EOC- = (EOC);
CP- = (CP);
WR_- = (WR_);
MR_CS_- = (MR_CS_);
BRESET_- = (BRESET_);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
```

```
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
LIM- = (LIM);
LIM- = (LIM);
CLRSPR_- = (CLRSPR_);
CLRSPR_- = (CLRSPR_);
LIM- = (LIM);
LIM- = (LIM);
NOS-.1 = (NOS.1);
NOS-.0 = (NOS.0);
NOS-.1 = (NOS.1);
NOS-.0 = (NOS.0);
MR-.5 = (MR.5);
MR-.4 = (MR.4);
MR-.3 = (MR.3);
MR-.2 = (MR.2);
MR-.1 = (MR.1);
MR-.0 = (MR.0);
MR-.5 = (MR.5);
MR-.4 = (MR.4);
MR-.3 = (MR.3);
MR-.2 = (MR.2);
MR-.1 = (MR.1);
MR-.0 = (MR.0);
MR-.5 = (MR.5);
MR-.4 = (MR.4);
MR-.3 = (MR.3);
MR-.2 = (MR.2);
MR-.1 = (MR.1);
MR-.0 = (MR.0);
WR_- = (WR_);
WR_- = (WR_);
YDIM_CS_- = (YDIM_CS_);
INCY- = (INCY);
EOR- = (EOR);
EOR- = (EOR);
STF- = (STF);
BRESET_- = (BRESET_);
INROW- = (INROW);
INROW- = (INROW);
INROW- = (INROW);
LSTROW- = (LSTROW);
LSTROW_1- = (LSTROW_1);
SCNDROW- = (SCNDROW);
FRSTROW- = (FRSTROW);
CP- = (CP);
CP- = (CP);
CP- = (CP);
BRESET_- = (BRESET_);
BRESET_- = (BRESET_);
BWAIT- = (BWAIT);
WAIT- = (WAIT);
BWAIT- = (BWAIT);
BWAIT- = (BWAIT);
STF- = (STF);
```

```
/* part instances *************************/

  U12(U12.Z-=Z) = N1B(INT_GT_1IN-=A);
  U3(U3.Z-=Z) = AND2B(PXL_EN-=A,U12.Z-=B);
  U1(BRESET_-=Z) = B3A(RESET_-=A);
  U10(U10.Z-=Z) = OR2A(LIM-=B,CLRSPR_-=A);
  U9(U9.Z-=Z) = N1A(LIM-=A);
  U8.1(NOS-.1=Z) = AND2C(U8.B-.1=B,U9.Z-=A);
  U8.0(NOS-.0=Z) = AND2C(U8.B-.0=B,U9.Z-=A);
  U0(MR-.5=Q.5,MR-.4=Q.4,MR-.3=Q.3,MR-.2=Q.2,MR-.1=Q.1,MR-.0=Q.0)
          = MR6(MR_CS_-=CS_,BRESET_-=RESET_,WR_-=WR_,U0.D-.5=D.5,
          U0.D-.4=D.4,U0.D-.3=D.3,U0.D-.2=D.2,U0.D-.1=D.1,
          U0.D-.0=D.0);
  U5(INROW-=INROW,LSTROW-=LAST,LSTROW_1-=LSTMINUS1,SCNDROW-=SECOND_ROW,
          FRSTROW-=FIRST_ROW) = Y_CNTV3(PDI-.15=PDI.15,PDI-.14=PDI.14,
          PDI-.13=PDI.13,PDI-.12=PDI.12,PDI-.11=PDI.11,PDI-.10=PDI.10,
          PDI-.9=PDI.9,PDI-.8=PDI.8,PDI-.7=PDI.7,PDI-.6=PDI.6,
          PDI-.5=PDI.5,PDI-.4=PDI.4,PDI-.3=PDI.3,PDI-.2=PDI.2,
          PDI-.1=PDI.1,PDI-.0=PDI.0,WR_-=WR_,YDIM_CS_-=CS_,
          INCY-=INC,CP-=CP,EOR-=EOR,STF-=STRT_FLG,BRESET_-=RESET_);
  U4(STF-=STF,HLT-=HLT,ENYAU-=ENYAU,CLRYAU-=CLRYAU) = CNVSEQV1FN(
          STRT-=STRT,STOP-=STOP,EOR-=EOR,BRESET_-=RESET_,
          U4.SNGL_CYC-=SNGL_CYC,U4.SNGL_LIN-=SNGL_LIN,
          U4.SNGL_FRM-=SNGL_FRM,EOC-=EOC,CP-=CP);
  U7(U7.Z-=Z) = AND2B(U10.Z-=B,BRESET_-=A);
  U6(LS_1-=LS_1,SPRCYC-=SPRCYC,SPR-.1=SPR.1,SPR-.0=SPR.0) =
          SPRSEQV2FN(LIM-=LIM,ENDCOL-=ENDCOL,INROW-=INROW,REQ-=REQ,
          RDY-=RDY,HLT-=HLT,BWAIT-=WAIT,ENSPR-=EN,CP-=CP,
          U8.B-.1=NS.1,U8.B-.0=NS.0,U7.Z-=RESET_);
  U11(BWAIT-=Z) = B3A(WAIT-=A);
  U2(CLRSPR_-=CLRSPR_,ENSPR-=ENSPR,SCNDCOL-=SECOND,EOC-=EOC,
          ENXAU-=ENXAU,CLRXAU-=CLRXAU,PSE-=PSE,REQ-=REQ,STB-=STB,
          REQ_O-=REQ_O,YADRSEL-=YADRSEL,S-=S,DUP-=DUP,YINCEN-=YINCEN,
          CMAGEN-=CMAGEN,SE-=SE,ENDCOL-=LAST) = X_CNTV5(U3.Z-=PXL_EN,
          DLY_POL-=DLY_POL,STF-=STRT_FLG,XDIM_CS_-=CS_,RDY-=RDY,
          INCX-=INC,WR_-=WR_,HLT-=HLT,INROW-=INROW,CP-=CP,
          PDI-.15=PDI.15,PDI-.14=PDI.14,PDI-.13=PDI.13,PDI-.12=PDI.12,
          PDI-.11=PDI.11,PDI-.10=PDI.10,PDI-.9=PDI.9,PDI-.8=PDI.8,
          PDI-.7=PDI.7,PDI-.6=PDI.6,PDI-.5=PDI.5,PDI-.4=PDI.4,
          PDI-.3=PDI.3,PDI-.2=PDI.2,PDI-.1=PDI.1,PDI-.0=PDI.0,
          BRESET_-=RESET_,YUP-=YUP,YDWN-=YDWN,SPRCYC-=SPRCYC,
          NOS-.1=NOS.1,NOS-.0=NOS.0,S_MODE-=S_MODE,BWAIT-=WAIT);

/* extractors ******************************/

  PDI-.5 = (U0.D-.5);
  PDI-.4 = (U0.D-.4);
  PDI-.3 = (U0.D-.3);
  PDI-.2 = (U0.D-.2);
  PDI-.1 = (U0.D-.1);
  PDI-.0 = (U0.D-.0);
  MR-.5 = (LIM-);
  MR-.4 = (U8.B-.1);
  MR-.3 = (U8.B-.0);
  M-0.2 = (U4.SNGL_CYC-);
  M-0.0 = (U4.SNGL_FRM-);
  M-0.1 = (U4.SNGL_LIN-);
  MR-.2 = (M-0.2);
  MR-.1 = (M-0.1);
  MR-.0 = (M-0.0);

/* type converters *********************/

ANNOTATIONS
{
  BUS BUS_TYPE = "DOT";
}

END MODULE;

/* * * * * * *  Contents of NET file PSDV2FN.NET  * * * * * * */
```

```
/*****************************************************/
/*  Netlist copyright (C) 1989 LSI Logic Corporation  */
/*****************************************************/


MODULE PSDV2FN;

INPUTS      CP,EOC,P1_BUSY,RESET_,SC,SE,S_MODE;
OUTPUTS     DLY_POL;

LEVEL FUNCTION;
DEFINE
  /* implicit connectors *******************/

    EOC- = (EOC);
    P1_BUSY- = (P1_BUSY);
    SE- = (SE);
    DLY_POL- = (DLY_POL);
    CP- = (CP);
    CP- = (CP);
    S_MODE- = (S_MODE);
    BRESET_- = (BRESET_);
    RESET_- = (RESET_);
    BRESET_- = (BRESET_);
    BRESET_- = (BRESET_);
    SC- = (SC);


  /* part instances **************************/

    U6(U6.Q-=Q) = FD2A(CP-=CP,BRESET_-=CD,U0.STBIT0O-=D);
    U1(DLY_POL-=Q) = FD2A(U0.DLY_POL-=D,CP-=CP,U4.Z-=CD);
    U7(U7.Z-=Z) = N1A(S_MODE-=A);
    U4(U4.Z-=Z) = AND2B(BRESET_-=A,U7.Z-=B);
    U3(U3.Z-=Z) = N1A(RESET_-=A);
    U2(BRESET_-=Z) = N1B(U3.Z-=A);
    U5(U5.Q-=Q) = FD2A(CP-=CP,BRESET_-=CD,U0.STBIT1O-=D);
    U0(U0.DLY_POL-=DLY_POL,U0.STBIT0O-=STBIT0O,U0.STBIT1O-=STBIT1O)
              = PSDV2CR(SC-=SC,EOC-=EOC,P1_BUSY-=P1_BUSY,SE-=SE,
             U6.Q-=STBIT0I,U5.Q-=STBIT1I);


  /* extractors *****************************/


  /* type converters *********************/

ANNOTATIONS
{
  BUS BUS_TYPE = "DOT";
}

END MODULE;


/* * * * * * *  Contents of NET file PSDV2CR.NET  * * * * * * */

/*****************************************************/
/*  Netlist copyright (C) 1989 LSI Logic Corporation  */
/*****************************************************/


MODULE PSDV2CR;

INPUTS      EOC,P1_BUSY,SC,SE,STBIT0I,STBIT1I;
OUTPUTS     DLY_POL,STBIT0O,STBIT1O;

LEVEL FUNCTION;
DEFINE
  /* implicit connectors ******************/
```

```
    STBIT1O- = (STBIT1O);
    STBIT0O- = (STBIT0O);
    P1_BUSY- = (P1_BUSY);
    DLY_POL- = (DLY_POL);
    STBIT0I- = (STBIT0I);
    SC- = (SC);
    SE- = (SE);
    STBIT1I- = (STBIT1I);
    EOC- = (EOC);

  /* part instances ***************************/

    M9(M9.Z-=Z) = ND4B(P1_BUSY-=C,STBIT0I-=D,M1.Z-=A,M3.Z-=B);
    M15(DLY_POL-=Z) = ND2B(M2.Z-=A,M9.Z-=B);
    M14(STBIT0O-=Z) = ND4B(M2.Z-=A,M7.Z-=B,M9.Z-=D,M8.Z-=C);
    M8(M8.Z-=Z) = ND3B(M3.Z-=B,SE-=A,STBIT0I-=C);
    M10(M10.Z-=Z) = N1B(STBIT0I-=A);
    M11(M11.Z-=Z) = N1B(STBIT1I-=A);
    M12(M12.Z-=Z) = ND3B(M10.Z-=B,M11.Z-=C,SC-=A);
    M13(STBIT1O-=Z) = ND4B(M2.Z-=A,M6.Z-=B,M9.Z-=C,M12.Z-=D);
    M6(M6.Z-=Z) = ND3B(M3.Z-=B,M1.Z-=A,STBIT1I-=C);
    M1(M1.Z-=Z) = N1B(SE-=A);
    M7(M7.Z-=Z) = ND3B(M3.Z-=B,SE-=A,STBIT1I-=C);
    M2(M2.Z-=Z) = ND3B(M3.Z-=A,STBIT0I-=B,STBIT1I-=C);
    M3(M3.Z-=Z) = N1C(EOC-=A);

  /* extractors ******************************/


  /* type converters *********************/

ANNOTATIONS
{
  BUS BUS_TYPE = "DOT";
}

END MODULE;


/* * * * * * *  Contents of NET file YAUCNTV4CR.NET  * * * * * * */

/*******************************************************/
/*  Netlist copyright (C) 1989 LSI Logic Corporation  */
/*******************************************************/


MODULE YAUCNTV4CR;

INPUTS      CLRYAU,ENYAU,FR,LIM,LR,LR_1,LS_1,SR,STBIT0I,STBIT1I,
            STBIT2I,YINCEN,YINT,YINT_1;
OUTPUTS     CE,CLD,CLRCNT,DCR,EOR,HLD,INCY,RLD,RST,STBIT0O,
            STBIT1O,STBIT2O,YINTSND;

LEVEL FUNCTION;
DEFINE
  /* implicit connectors *******************/

    YINTSND- = (YINTSND);
    DCR- = (DCR);
    EOR- = (EOR);
    RST- = (RST);
    CLRCNT- = (CLRCNT);
    STBIT2I- = (STBIT2I);
    CLD- = (CLD);
    STBIT1O- = (STBIT1O);
    LR- = (LR);
    YINT- = (YINT);
    STBIT0I- = (STBIT0I);
    SR- = (SR);
    INCY- = (INCY);
```

```
 LR_1- = (LR_1);
 RLD- = (RLD);
 HLD- = (HLD);
 ENYAU- = (ENYAU);
 YINT_1- = (YINT_1);
 STBIT1I- = (STBIT1I);
 CLRYAU- = (CLRYAU);
 STBIT0O- = (STBIT0O);
 CE- = (CE);
 LS_1- = (LS_1);
 YINCEN- = (YINCEN);
 LIM- = (LIM);
 STBIT2O- = (STBIT2O);
 FR- = (FR);


/* part instances ***************************/

 M9(M9.Z-=Z) = N1C(STBIT2I-=A);
 M18(M18.Z-=Z) = N1C(LR-=A);
 M2(M2.Z-=Z) = N1D(STBIT0I-=A);
 M133(M133.Z-=Z) = N1C(M9.Z-=A);
 M15(M15.Z-=Z) = N1C(SR-=A);
 M129(M129.Z-=Z) = N1C(M2.Z-=A);
 M51(M51.Z-=Z) = N1B(YINT-=A);
 M57(M57.Z-=Z) = AND2C(M12.Z-=A,M129.Z-=B);
 M16(M16.Z-=Z) = N1C(LR_1-=A);
 M100(M100.Z-=Z) = AND2B(LR_1-=B,M12.Z-=A);
 M189(RLD-=Z) = ND3B(M55.Z-=A,M116.Z-=C,M72.Z-=B);
 M37(M37.Z-=Z) = AND2C(M12.Z-=B,M36.Z-=A);
 M36(M36.Z-=Z) = N1C(ENYAU-=A);
 M128(M128.Z-=Z) = N1C(M36.Z-=A);
 M136(M136.Z-=Z) = ND4B(M12.Z-=B,M36.Z-=A,M130.Z-=D,M2.Z-=C);
 M145(M145.Z-=Z) = AND2B(M135.Z-=A,M136.Z-=B);
 M58(M58.Z-=Z) = AND2B(M130.Z-=A,M9.Z-=B);
 M131(M131.Z-=Z) = ND3B(M69.Z-=A,M58.Z-=C,M57.Z-=B);
 M69(M69.Z-=Z) = AND2B(M68.Z-=A,M128.Z-=B);
 M68(M68.Z-=Z) = N1B(YINT_1-=A);
 M56(M56.Z-=Z) = AND2B(YINT_1-=A,M128.Z-=B);
 M71(M71.Z-=Z) = AND2C(M9.Z-=B,M7.Z-=A);
 M7(M7.Z-=Z) = N1D(STBIT1I-=A);
 M12(M12.Z-=Z) = N1D(CLRYAU-=A);
 M73(M73.Z-=Z) = ND4B(CLRYAU-=A,M130.Z-=C,M2.Z-=B,M133.Z-=D);
 M11(M11.Z-=Z) = ND3B(CLRYAU-=A,M129.Z-=B,M7.Z-=C);
 M130(M130.Z-=Z) = N1C(M7.Z-=A);
 M175(CE-=Z) = ND4B(M22.Z-=A,M35.Z-=B,M84.Z-=C,M88.Z-=D);
 M147(M147.Z-=Z) = AND2B(M22.Z-=A,M35.Z-=B);
 M150(STBIT0O-=Z) = ND3B(M148.Z-=B,M147.Z-=A,M149.Z-=C);
 M148(M148.Z-=Z) = AND2B(M62.Z-=A,M80.Z-=B);
 M157(M157.Z-=Z) = ND3B(M31.Z-=C,M10.Z-=A,M11.Z-=B);
 M159(M159.Z-=Z) = NR2B(M158.Z-=B,M157.Z-=A);
 M158(M158.Z-=Z) = ND2B(M62.Z-=B,M59.Z-=A);
 M62(M62.Z-=Z) = ND3C(M45.Z-=B,M133.Z-=C,M37.Z-=A);
 M38(M38.Z-=Z) = AND2B(M130.Z-=B,M2.Z-=A);
 M77(M77.Z-=Z) = ND3C(M44.Z-=A,M38.Z-=B,M9.Z-=C);
 M44(M44.Z-=Z) = AND2B(M12.Z-=B,M128.Z-=A);
 M151(M151.Z-=Z) = AND3B(M35.Z-=A,M43.Z-=B,M46.Z-=C);
 M181(M181.Z-=Z) = ND2B(M35.Z-=A,M43.Z-=B);
 M168(M168.Z-=Z) = ND2B(M43.Z-=A,M46.Z-=B);
 M46(M46.Z-=Z) = ND3B(M45.Z-=B,M44.Z-=A,M133.Z-=C);
 M80(M80.Z-=Z) = ND3B(M45.Z-=B,M9.Z-=C,M37.Z-=A);
 M45(M45.Z-=Z) = AND2B(M129.Z-=A,M7.Z-=B);
 M27(M27.Z-=Z) = N1C(LIM-=A);
 M4(M4.Z-=Z) = N1B(YINCEN-=A);
 M141(M141.Z-=Z) = AND2B(M89.Z-=A,M98.Z-=B);
 M89(M89.Z-=Z) = ND4B(M2.Z-=B,M4.Z-=A,M133.Z-=D,M7.Z-=C);
 M137(M137.Z-=Z) = ND3B(M130.Z-=B,M2.Z-=A,M9.Z-=C);
 M164(M164.Z-=Z) = ND2B(M137.Z-=A,M138.Z-=B);
 M138(M138.Z-=Z) = ND3B(M2.Z-=B,M4.Z-=A,M7.Z-=C);
 M8(M8.Z-=Z) = ND3B(M1.Z-=B,M3.Z-=A,M7.Z-=C);
 M3(M3.Z-=Z) = AND2B(LIM-=B,M4.Z-=A);
 M120(M120.Z-=Z) = AND2B(LIM-=B,YINCEN-=A);
 M94(M94.Z-=Z) = ND4B(YINCEN-=A,M2.Z-=B,M133.Z-=D,M7.Z-=C);
 M191(M191.Z-=Z) = AND2B(M94.Z-=A,M124.Z-=B);
```

```
M124(M124.Z--Z) = ND3B(M122.Z--B,M120.Z--A,M71.Z--C);
M122(M122.Z--Z) = AND2B(M121.Z--A,M2.Z--B);
M121(M121.Z--Z) = N1B(LS_1--A);
M1(M1.Z--Z) = AND2B(LS_1--A,M2.Z--B);
M127(M127.Z--Z) = ND3B(M120.Z--A,M1 Z--B,M7.Z--C);
M132(M132.Z--Z) = ND4B(YINT_1--A,M12.Z--B,M129.Z--C,M7.Z--D);
M149(M149.Z--Z) = AND3B(M135.Z--C,M112.Z--A,M132.Z--B);
M110(M110.Z--Z) = AND3B(M12.Z--A,M2.Z--C,M18.Z--B);
M112(M112.Z--Z) = ND3B(M111.Z--C,M110.Z--B,M81.Z--A);
M111(M111.Z--Z) = AND2B(M130.Z--A,M133.Z--B);
M134(M134.Z--Z) = AND2B(M129.Z--A,M130.Z--B);
M135(M135.Z--Z) = ND3B(M134.Z--B,M9.Z--C,M37.Z--A);
M39(M39.Z--Z) = ND3B(M38.Z--B,M133.Z--C,M37.Z--A);
M139(M139.Z--Z) = AND2B(M8.Z--A,M39.Z--B);
M142(STBIT20--Z) = ND3B(M141.Z--C,M140.Z--B,M139.Z--A);
M140(M140.Z--Z) = AND2B(M62.Z--A,M77.Z--B);
M171(M171.Z--Z) = ND2B(M80.Z--B,M77.Z--A);
M161(M161.Z--Z) = ND2B(M124.Z--B,M80.Z--A);
M162(M162.Z--Z) = NR2B(M161.Z--B,M160.Z--A);
M166(HLD--Z) = ND3B(M159.Z--A,M162.Z--B,M165.Z--C);
M165(M165.Z--Z) = NR2B(M164.Z--B,M163.Z--A);
M163(M163.Z--Z) = ND2B(M135.Z--A,M136.Z--B);
M154(M154.Z--Z) = ND2B(M136.Z--B,M131.Z--A);
M187(M187.Z--Z) = AND3B(M116.Z--B,M108.Z--A,M131.Z--C);
M116(M116.Z--Z) = ND3C(M114.Z--B,M92.Z--C,M81.Z--A);
M114(M114.Z--Z) = AND3B(LR_1--B,M12.Z--A,M27.Z--C);
M14(M14.Z--Z) = N1C(FR--A);
M17(M17.Z--Z) = AND3B(M14.Z--A,M15.Z--B,M16.Z--C);
M66(M66.Z--Z) = ND3B(M64.Z--B,M30.Z--C,M13.Z--A);
M64(M64.Z--Z) = AND3B(M14.Z--A,M18.Z--C,M16.Z--B);
M24(M24.Z--Z) = ND2B(M12.Z--A,M14.Z--B);
M33(M33.Z--Z) = AND2B(LIM--B,M12.Z--A);
M55(M55.Z--Z) = ND3B(M52.Z--A,M33.Z--B,M30.Z--C);
M52(M52.Z--Z) = AND2B(M51.Z--A,M128.Z--B);
M74(M74.Z--Z) = ND3B(M130.Z--C,M51.Z--A,M2.Z--B);
M160(M160.Z--Z) = ND3B(M72.Z--A,M73.Z--B,M74.Z--C);
M72(M72.Z--Z) = ND3B(M69.Z--A,M71.Z--C,M57.Z--B);
M88(M88.Z--Z) = ND3B(M71.Z--C,M86.Z--B,M81.Z--A);
M86(M86.Z--Z) = AND3B(M12.Z--A,M129.Z--C,M16.Z--B);
M82(M82.Z--Z) = AND3B(LIM--B,M12.Z--A,M129.Z--C);
M84(M84.Z--Z) = ND3B(M71.Z--C,M82.Z--B,M81.Z--A);
M173(M173.Z--Z) = AND3B(M116.Z--C,M84.Z--A,M88.Z--B);
M185(M185.Z--Z) = ND2B(M84.Z--A,M88.Z--B);
M184(M184.Z--Z) = ND2B(M59.Z--A,M66.Z--B);
M186(M186.Z--Z) = NR2B(M185.Z--B,M184.Z--A);
M188(INCY--Z) = ND3B(M187.Z--C,M183.Z--A,M186.Z--B);
M183(M183.Z--Z) = NR2B(M181.Z--A,M182.Z--B);
M182(M182.Z--Z) = ND2B(M50.Z--B,M46.Z--A);
M50(M50.Z--Z) = ND3B(M48.Z--B,M30.Z--C,M13.Z--A);
M48(M48.Z--Z) = AND3B(M15.Z--A,M18.Z--C,M16.Z--B);
M105(M105.Z--Z) = ND2B(M2.Z--B,M16.Z--A);
M26(M26.Z--Z) = ND2B(M15.Z--A,M16.Z--B);
M104(M104.Z--Z) = AND3B(M12.Z--A,M14.Z--B,M15.Z--C);
M108(M108.Z--Z) = ND3B(M104.Z--B,M81.Z--A,M107.Z--C);
M107(M107.Z--Z) = NR2B(M105.Z--A,M20.Z--B);
M20(M20.Z--Z) = ND2B(M130.Z--A,M133.Z--B);
M30(M30.Z--Z) = AND3C(M130.Z--B,M2.Z--A,M133.Z--C);
M101(M101.Z--Z) = AND3B(M130.Z--C,M2.Z--B,M27.Z--A);
M102(M102.Z--Z) = ND3B(M100.Z--B,M99.Z--A,M101.Z--C);
M99(M99.Z--Z) = AND2B(YINT_1--B,YINT--A);
M32(M32.Z--Z) = AND2B(YINT--A,M128.Z--B);
M23(M23.Z--Z) = ND2B(YINT--A,M128.Z--B);
M25(M25.Z--Z) = NR2B(M24.Z--B,M23.Z--A);
M31(M31.Z--Z) = ND3C(M30.Z--C,M29.Z--B,M25.Z--A);
M29(M29.Z--Z) = NR2B(M28.Z--B,M26.Z--A);
M28(M28.Z--Z) = ND2B(LR--A,M27.Z--B);
M67(M67.Z--Z) = ND4B(YINCEN--A,M2.Z--C,M7.Z--D,M27.Z--B);
M143(M143.Z--Z) = AND3B(M94.Z--C,M77.Z--B,M67.Z--A);
M146(STBIT10--Z) = ND3B(M145.Z--C,M144.Z--B,M143.Z--A);
M144(M144.Z--Z) = AND3B(M116.Z--B,M102.Z--A,M127.Z--C);
M192(CLD--Z) = ND3B(M191.Z--B,M190.Z--A,M127.Z--C);
M190(M190.Z--Z) = AND2B(M55.Z--A,M93.Z--B);
M93(M93.Z--Z) = ND3B(M69.Z--A,M33.Z--B,M92.Z--C);
M92(M92.Z--Z) = AND3B(M129.Z--A,M9.Z--C,M7.Z--B);
```

```
    M10(M10.Z-=Z) = ND3B(CLRYAU-=A,M129.Z-=B,M9.Z-=C);
    M177(M177.Z-=Z) = AND2B(M10.Z-=A,M11.Z-=B);
    M180(CLRCNT-=Z) = ND3B(M10.Z-=A,M11.Z-=B,M73.Z-=C);
    M179(RST-=Z) = ND3B(M178.Z-=B,M177.Z-=A,M73.Z-=C);
    M178(M178.Z-=Z) = AND2B(M31.Z-=A,M59.Z-=B);
    M176(EOR-=Z) = ND2B(M31.Z-=A,M59.Z-=B);
    M59(M59.Z-=Z) = ND3C(M58.Z-=C,M56.Z-=A,M57.Z-=B);
    M119(M119.Z-=Z) = ND3B(M99.Z-=A,M7.Z-=C,M57.Z-=B);
    M153(M153.Z-=Z) = ND2B(M77.Z-=A,M119.Z-=B);
    M155(M155.Z-=Z) = NR2B(M154.Z-=B,M153.Z-=A);
    M156(DCR-=Z) = ND3B(M152.Z-=B,M151.Z-=A,M155.Z-=C);
    M152(M152.Z-=Z) = AND3B(M62.Z-=B,M50.Z-=A,M66.Z-=C);
    M170(M170.Z-=Z) = ND2B(M50.Z-=A,M66.Z-=B);
    M172(M172.Z-=Z) = NR2B(M171.Z-=B,M170.Z-=A);
    M174(YINTSND-=Z) = ND3B(M173.Z-=C,M169.Z-=A,M172.Z-=B);
    M169(M169.Z-=Z) = NR2B(M168.Z-=B,M167.Z-=A);
    M167(M167.Z-=Z) = ND2B(M31.Z-=A,M35.Z-=B);
    M35(M35.Z-=Z) = ND3C(M33.Z-=B,M32.Z-=A,M30.Z-=C);
    M43(M43.Z-=Z) = ND3B(M41.Z-=B,M30.Z-=C,M13.Z-=A);
    M41(M41.Z-=Z) = AND3B(M14.Z-=A,M15.Z-=B,M18.Z-=C);
    M19(M19.Z-=Z) = ND2B(M2.Z-=B,M18.Z-=A);
    M21(M21.Z-=Z) = NR2B(M20.Z-=B,M19.Z-=A);
    M22(M22.Z-=Z) = ND3B(M17.Z-=B,M13.Z-=A,M21.Z-=C);
    M13(M13.Z-=Z) = AND3C(YINT-=A,M12.Z-=C,M128.Z-=B);
    M81(M81.Z-=Z) = AND3C(YINT_1-=B,YINT-=A,M128.Z-=C);
    M98(M98.Z-=Z) = ND3B(M38.Z-=C,M96.Z-=B,M81.Z-=A);
    M96(M96.Z-=Z) = AND3B(FR-=B,M12.Z-=A,M27.Z-=C);


  /* extractors ******************************/


  /* type converters *********************/

ANNOTATIONS
{
  BUS BUS_TYPE = "DOT";
}

END MODULE;


/* * * * * * *  Contents of NET file MR5.NET  * * * * * * */

/*******************************************************/
/*  Netlist copyright (C) 1989 LSI Logic Corporation  */
/*******************************************************/

MODULE MR5;

INPUTS      CS_,D.4,D.3,D.2,D.1,D.0,RESET_,WR_;
OUTPUTS     Q.4,Q.3,Q.2,Q.1,Q.0;

LEVEL FUNCTION;
DEFINE
  /* implicit connectors *******************/

    WR_- = (WR_);
    CS_- = (CS_);
    D-.4 = (D.4);
    D-.3 = (D.3);
    D-.2 = (D.2);
    D-.1 = (D.1);
    D-.0 = (D.0);
    RESET_- = (RESET_);
    Q-.4 = (Q.4);
    Q-.3 = (Q.3);
    Q-.2 = (Q.2);
    Q-.1 = (Q.1);
    Q-.0 = (Q.0);


  /* part instances ***************************/
```

```
    U0(U0.Z-=Z) = OR2B(WR_-=B,CS_-=A);
    U1.4(Q-.4=Q) = FD2A(U0.Z-=CP,D-.4=D,RESET_-=CD);
    U1.3(Q-.3=Q) = FD2A(U0.Z-=CP,D-.3=D,RESET_-=CD);
    U1.2(Q-.2=Q) = FD2A(U0.Z-=CP,D-.2=D,RESET_-=CD);
    U1.1(Q-.1=Q) = FD2A(U0.Z-=CP,D-.1=D,RESET_-=CD);
    U1.0(Q-.0=Q) = FD2A(U0.Z-=CP,D-.0=D,RESET_-=CD);


  /* extractors ******************************/


  /* type converters *********************/

ANNOTATIONS
{
  BUS BUS_TYPE = "DOT";
}

END MODULE;


/* * * * * * *  Contents of NET file INCR3.NET  * * * * * * */

/*****************************************************/
/*  Netlist copyright (C) 1989 LSI Logic Corporation  */
/*****************************************************/


MODULE INCR3;

INPUTS      A.2,A.1,A.0,CIN,EN;
OUTPUTS     Y.2,Y.1,Y.0;

LEVEL FUNCTION;

DEFINE
  /* implicit connectors *******************/

    CIN- = (CIN);
    EN- = (EN);
    A-.2 = (A.2);
    A-.1 = (A.1);
    A-.0 = (A.0);
    Y-.2 = (Y.2);
    Y-.1 = (Y.1);
    Y-.0 = (Y.0);


  /* part instances ***************************/

    U1(U1.Z-=Z) = AND2B(CIN-=A,EN-=B);
    M___1(M___1.Y1-=Y1,M___1.Y2-=Y2,M___1.Y0-=Y0) = INCR3_INC3(U1.Z-=CIN,
           M___1.A0-=A0,M___1.A1-=A1,M___1.A2-=A2);


  /* extractors ******************************/

    Y-.2 = (M___1.Y2-);
    Y-.0 = (M___1.Y0-);
    A-.1 = (M___1.A1-);
    A-.0 = (M___1.A0-);
    A-.2 = (M___1.A2-);
    Y-.1 = (M___1.Y1-);


  /* type converters *********************/

ANNOTATIONS
{
  BUS BUS_TYPE = "DOT";
}

END MODULE;
```

```
/* * * * * * *  Contents of NET file INCR3_INC3.NET  * * * * * * */

/*******************************************************/
/*  Netlist copyright (C) 1989 LSI Logic Corporation  */
/*******************************************************/


MODULE INCR3_INC3;

INPUTS      A0,A1,A2,CIN;
OUTPUTS     Y0,Y1,Y2;

LEVEL FUNCTION;
DEFINE
  /* implicit connectors *******************/

    Y0- = (Y0);
    A0- = (A0);
    Y1- = (Y1);
    CIN- = (CIN);
    A2- = (A2);
    Y2- = (Y2);
    A1- = (A1);

  /* part instances *************************/

    M___5(Y0-=Z) = EOC(M___1.Z-=A,A0-=B);
    M___6(Y1-=Z) = ENC(M___2.Z-=A,A1-=B);
    M___2(M___2.Z-=Z) = ND2B(A0-=B,M___1.Z-=A);
    M___1(M___1.Z-=Z) = B3A(CIN-=A);
    M___7(Y2-=Z) = ENC(A2-=B,M___3.Z-=A);
    M___3(M___3.Z-=Z) = ND3B(A0-=B,A1-=C,M___1.Z-=A);


  /* extractors *****************************/


  /* type converters *********************/

ANNOTATIONS
{
  BUS BUS_TYPE = "DOT";
}

END MODULE;


/* * * * * * *  Contents of NET file CNT3UDCR.NET  * * * * * * */

/*******************************************************/
/*  Netlist copyright (C) 1989 LSI Logic Corporation  */
/*******************************************************/


MODULE CNT3UDCR;

INPUTS      CD,CU,STBIT0I,STBIT1I,STBIT2I;
OUTPUTS     BR,CO,STBIT0O,STBIT1O,STBIT2O;

LEVEL FUNCTION;
DEFINE
  /* implicit connectors *******************/

    STBIT2O- = (STBIT2O);
    STBIT2I- = (STBIT2I);
    STBIT0O- = (STBIT0O);
    BR- = (BR);
    STBIT1I- = (STBIT1I);
    CU- = (CU);
    STBIT1O- = (STBIT1O);
    STBIT0I- = (STBIT0I);
    CO- = (CO);
    CD- = (CD);
```

```
/* part instances ***************************/

   M8(M8.Z-=Z) = N1C(STBIT2I-=A);
   M40(M40.Z-=Z) = N1C(M8.Z-=A);
   M42(M42.Z-=Z) = N1C(M3.Z-=A);
   M39(BR-=Z) = N1B(M17.Z-=A);
   M2(M2.Z-=Z) = N1C(STBIT1I-=A);
   M19(M19.Z-=Z) = N1C(M7.Z-=A);
   M7(M7.Z-=Z) = N1C(CU-=A);
   M10(M10.Z-=Z) = ND3B(M7.Z-=A,M3.Z-=B,M40.Z-=C);
   M41(M41.Z-=Z) = N1C(M2.Z-=A);
   M23(M23.Z-=Z) = ND3B(M3.Z-=A,M41.Z-=B,M8.Z-=C);
   M24(M24.Z-=Z) = ND3B(STBIT0I-=B,M42.Z-=A,M40.Z-=C);
   M36(M36.Z-=Z) = AND2B(M26.Z-=A,M28.Z-=B);
   M28(M28.Z-=Z) = ND3B(STBIT0I-=C,M7.Z-=A,M3.Z-=B);
   M38(CO-=Z) = N1B(M13.Z-=A);
   M11(M11.Z-=Z) = AND2B(M19.Z-=A,M3.Z-=B);
   M13(M13.Z-=Z) = ND3B(M12.Z-=B,M11.Z-=A,M40.Z-=C);
   M12(M12.Z-=Z) = AND2B(STBIT0I-=A,M41.Z-=B);
   M15(M15.Z-=Z) = N1B(STBIT0I-=A);
   M20(M20.Z-=Z) = AND2B(M15.Z-=A,M41.Z-=B);
   M27(M27.Z-=Z) = ND3B(M19.Z-=A,M42.Z-=B,M41.Z-=C);
   M32(M32.Z-=Z) = AND2B(M23.Z-=A,M27.Z-=B);
   M33(STBIT1O-=Z) = ND3B(M32.Z-=B,M31.Z-=A,M29.Z-=C);
   M29(M29.Z-=Z) = ND3B(M7.Z-=A,M41.Z-=B,M40.Z-=C);
   M9(M9.Z-=Z) = ND4B(M7.Z-=A,M42.Z-=B,M2.Z-=C,M8.Z-=D);
   M31(M31.Z-=Z) = AND2B(M1.Z-=A,M9.Z-=B);
   M1(M1.Z-=Z) = ND4B(M19.Z-=A,M3.Z-=B,M2.Z-=C,M40.Z-=D);
   M26(M26.Z-=Z) = ND3B(STBIT0I-=B,M19.Z-=A,M2.Z-=C);
   M16(M16.Z-=Z) = AND2B(M15.Z-=A,M2.Z-=B);
   M17(M17.Z-=Z) = ND3B(M16.Z-=B,M14.Z-=A,M8.Z-=C);
   M14(M14.Z-=Z) = AND2B(M7.Z-=A,M42.Z-=B);
   M4(M4.Z-=Z) = ND3B(M19.Z-=A,M42.Z-=B,M40.Z-=C);
   M21(M21.Z-=Z) = ND3B(M20.Z-=B,M11.Z-=A,M40.Z-=C);
   M34(M34.Z-=Z) = AND2B(M17.Z-=A,M21.Z-=B);
   M37(STBIT0O-=Z) = ND3B(M36.Z-=C,M35.Z-=B,M34.Z-=A);
   M35(M35.Z-=Z) = AND2B(M24.Z-=A,M25.Z-=B);
   M25(M25.Z-=Z) = ND3B(STBIT0I-=A,M41.Z-=B,M8.Z-=C);
   M18(M18.Z-=Z) = ND3B(M7.Z-=A,M42.Z-=B,M8.Z-=C);
   M30(STBIT2O-=Z) = ND4B(M10.Z-=B,M4.Z-=A,M22.Z-=D,M18.Z-=C);
   M22(M22.Z-=Z) = ND3B(M19.Z-=A,M3.Z-=B,M8.Z-=C);
   M3(M3.Z-=Z) = N1C(CD-=A);


/* extractors *******************************/


/* type converters *********************/

ANNOTATIONS
{
  BUS BUS_TYPE = "DOT";
}

END MODULE;


/* * * * * * *  Contents of NET file YAUCNTV4FN.NET  * * * * * * */

/*******************************************************/
/*  Netlist copyright (C) 1989 LSI Logic Corporation  */
/*******************************************************/


MODULE YAUCNTV4FN;

INPUTS      CLRYAU,CP,ENYAU,FR,LIM,LR,LR_1,LS_1,RESET_,SR,YINCEN,
            YINT,YINT_1;
OUTPUTS     CE,CLD,CLRCNT_,DCR_,EOR,HLD,INCY,RLD,RST_,YINTSND;

LEVEL FUNCTION;
```

```
DEFINE
  /* implicit connectors ******************/

    YINCEN- = (YINCEN);
    SR- = (SR);
    LS_1- = (LS_1);
    LR_1- = (LR_1);
    YINT- = (YINT);
    YINT_1- = (YINT_1);
    LR- = (LR);
    LIM- = (LIM);
    ENYAU- = (ENYAU);
    CLRYAU- = (CLRYAU);
    HLD- = (HLD);
    CP- = (CP);
    RESET_- = (RESET_);
    RESET_- = (RESET_);
    YINTSND- = (YINTSND);
    EOR- = (EOR);
    INCY- = (INCY);
    CLD- = (CLD);
    RLD- = (RLD);
    CE- = (CE);
    CLRCNT_- = (CLRCNT_);
    RST_- = (RST_);
    DCR_- = (DCR_);
    CP- = (CP);
    CP- = (CP);
    FR- = (FR);


  /* part instances **************************/

    U1(HLD-=Q) = FD4A(RESET_-=SD,U5.HLD-=D,CP-=CP);
    U7.8(U7.Q-.8=Q,U7.QN-.8=QN) = FD2A(U7.D-.8=D,RESET_-=CD,CP-=CP);
    U7.7(U7.Q-.7=Q,U7.QN-.7=QN) = FD2A(U7.D-.7=D,RESET_-=CD,CP-=CP);
    U7.6(U7.Q-.6=Q,U7.QN-.6=QN) = FD2A(U7.D-.6=D,RESET_-=CD,CP-=CP);
    U7.5(U7.Q-.5=Q,U7.QN-.5=QN) = FD2A(U7.D-.5=D,RESET_-=CD,CP-=CP);
    U7.4(U7.Q-.4=Q,U7.QN-.4=QN) = FD2A(U7.D-.4=D,RESET_-=CD,CP-=CP);
    U7.3(U7.Q-.3=Q,U7.QN-.3=QN) = FD2A(U7.D-.3=D,RESET_-=CD,CP-=CP);
    U7.2(U7.Q-.2=Q,U7.QN-.2=QN) = FD2A(U7.D-.2=D,RESET_-=CD,CP-=CP);
    U7.1(U7.Q-.1=Q,U7.QN-.1=QN) = FD2A(U7.D-.1=D,RESET_-=CD,CP-=CP);
    U7.0(U7.Q-.0=Q,U7.QN-.0=QN) = FD2A(U7.D-.0=D,RESET_-=CD,CP-=CP);
    U0.2(U0.Q-.2=Q) = FD2A(RESET_-=CD,CP-=CP,U0.D-.2=D);
    U0.1(U0.Q-.1=Q) = FD2A(RESET_-=CD,CP-=CP,U0.D-.1=D);
    U0.0(U0.Q-.0=Q) = FD2A(RESET_-=CD,CP-=CP,U0.D-.0=D);
    U5(U5.EOR-=EOR,U5.DCR-=DCR,U5.CLRCNT-=CLRCNT,U5.CLD-=CLD,
            U5.CE-=CE,U5.INCY-=INCY,U5.RLD-=RLD,U5.RST-=RST,
            U5.HLD-=HLD,U5.YINTSND-=YINTSND,U5.STBIT0O-=STBIT0O,
            U5.STBIT1O-=STBIT1O,U5.STBIT2O-=STBIT2O) = YAUCNTV4CR(
            YINCEN-=YINCEN,U5.STBIT2I-=STBIT2I,U5.STBIT1I-=STBIT1I,
            U5.STBIT0I-=STBIT0I,SR-=SR,LS_1-=LS_1,LR_1-=LR_1,
            YINT-=YINT,YINT_1-=YINT_1,LR-=LR,LIM-=LIM,FR-=FR,
            ENYAU-=ENYAU,CLRYAU-=CLRYAU);


  /* extractors ******************************/

    U7.D-.5 = (U5.INCY-);
    U7.D-.6 = (U5.RLD-);
    U7.D-.4 = (U5.EOR-);
    U7.D-.1 = (U5.CLD-);
    U7.D-.8 = (U5.YINTSND-);
    U7.D-.3 = (U5.DCR-);
    U7.D-.0 = (U5.CE-);
    U7.D-.2 = (U5.CLRCNT-);
    U7.D-.7 = (U5.RST-);
    U7.Q-.8 = (YINTSND-);
    U7.Q-.4 = (EOR-);
    U7.Q-.5 = (INCY-);
    U7.Q-.1 = (CLD-);
    U7.Q-.6 = (RLD-);
    U7.Q-.0 = (CE-);
    U7.QN-.2 = (CLRCNT_-);
```

```
    U7.QN-.7 = (RST_-);
    U7.QN-.3 = (DCR_-);
    U0.Q-.2 = (U5.STBIT2I-);
    U0.Q-.1 = (U5.STBIT1I-);
    U0.Q-.0 = (U5.STBIT0I-);
    U0.D-.0 = (U5.STBIT0O-);
    U0.D-.1 = (U5.STBIT1O-);
    U0.D-.2 = (U5.STBIT2O-);


  /* type converters *********************/

ANNOTATIONS
{
  BUS BUS_TYPE = "DOT";
}

END MODULE;



/* * * * * * *  Contents of NET file RWORDCR.NET  * * * * * * */

/*****************************************************/
/*  Netlist copyright (C) 1989 LSI Logic Corporation  */
/*****************************************************/


MODULE RWORDCR;

INPUTS      CD,CU,STBIT0I,STBIT1I,STBIT2I;
OUTPUTS     CO,STBIT0O,STBIT1O,STBIT2O;

LEVEL FUNCTION;
DEFINE
  /* implicit connectors *******************/

    STBIT2I- = (STBIT2I);
    CU- = (CU);
    STBIT1I- = (STBIT1I);
    STBIT0I- = (STBIT0I);
    CO- = (CO);
    STBIT0O- = (STBIT0O);
    STBIT1O- = (STBIT1O);
    STBIT2O- = (STBIT2O);
    CD- = (CD);


  /* part instances *************************/

    M14(M14.Z-=Z) = N1C(CU-=A);
    M36(M36.Z-=Z) = ND4B(M4.Z-=C,CU-=A,STBIT1I-=D,CD-=B);
    M37(M37.Z-=Z) = ND4B(M4.Z-=B,M14.Z-=A,STBIT1I-=C,STBIT2I-=D);
    M15(M15.Z-=Z) = AND2B(M14.Z-=A,CD-=B);
    M7(M7.Z-=Z) = N1B(STBIT1I-=A);
    M4(M4.Z-=Z) = N1C(STBIT0I-=A);
    M11(M11.Z-=Z) = AND2C(M7.Z-=B,STBIT0I-=A);
    M34(M34.Z-=Z) = ND4B(M2.Z-=B,M12.Z-=D,M4.Z-=C,CU-=A);
    M45(CO-=Z) = N1B(M24.Z-=A);
    M24(M24.Z-=Z) = ND3B(M12.Z-=C,M1.Z-=A,M11.Z-=B);
    M12(M12.Z-=Z) = N1C(STBIT2I-=A);
    M10(M10.Z-=Z) = AND2B(CU-=A,CD-=B);
    M13(M13.Z-=Z) = ND3B(M12.Z-=C,M10.Z-=A,M11.Z-=B);
    M44(STBIT0O-=Z) = ND4B(M13.Z-=A,M27.Z-=B,M30.Z-=C,M33.Z-=D);
    M33(M33.Z-=Z) = ND3B(M12.Z-=C,M31.Z-=A,M11.Z-=B);
    M17(M17.Z-=Z) = ND3B(M12.Z-=C,M15.Z-=A,M11.Z-=B);
    M27(M27.Z-=Z) = ND3B(M12.Z-=C,M8.Z-=B,M15.Z-=A);
    M8(M8.Z-=Z) = AND2B(M7.Z-=B,M4.Z-=A);
    M19(M19.Z-=Z) = AND2B(M4.Z-=A,STBIT1I-=B);
    M35(M35.Z-=Z) = ND4B(M2.Z-=A,M12.Z-=D,M4.Z-=B,STBIT1I-=C);
    M42(M42.Z-=Z) = AND2B(M36.Z-=B,M35.Z-=A);
    M43(STBIT1O-=Z) = ND3B(M37.Z-=C,M41.Z-=A,M42.Z-=B);
    M41(M41.Z-=Z) = AND2B(M17.Z-=B,M9.Z-=A);
    M9(M9.Z-=Z) = ND3B(M1.Z-=A,M8.Z-=B,STBIT2I-=C);
```

```
    M1(M1.Z--=Z) = AND2B(M2.Z--=B,CU--=A);
    M3(M3.Z--=Z) = ND4B(M4.Z--=C,CU--=A,STBIT2I--=D,CD--=B);
    M38(M38.Z--=Z) = AND2B(M17.Z--=B,M3.Z--=A);
    M40(STBIT2O--=Z) = ND3B(M34.Z--=C,M38.Z--=A,M39.Z--=B);
    M39(M39.Z--=Z) = AND2B(M21.Z--=B,M20.Z--=A);
    M20(M20.Z--=Z) = ND3B(M12.Z--=C,M15.Z--=A,M19.Z--=B);
    M30(M30.Z--=Z) = ND3B(M1.Z--=A,M19.Z--=B,STBIT2I--=C);
    M21(M21.Z--=Z) = ND4B(M2.Z--=B,M4.Z--=C,M14.Z--=A,STBIT2I--=D);
    M31(M31.Z--=Z) = AND2B(M2.Z--=B,M14.Z--=A);
    M2(M2.Z--=Z) = N1C(CD--=A);

  /* extractors ******************************/


  /* type converters *********************/

ANNOTATIONS
{
  BUS BUS_TYPE = "DOT";
}

END MODULE;



/* * * * * * *  Contents of NET file CNT3UDFN.NET  * * * * * * */

/*******************************************************/
/*  Netlist copyright (C) 1989 LSI Logic Corporation  */
/*******************************************************/


MODULE CNT3UDFN;

INPUTS      CD,CP,CU,DI.2,DI.1,DI.0,LD_,RESET_;
OUTPUTS     BR,CO,Q.2,Q.1,Q.0;

LEVEL FUNCTION;
DEFINE
  /* implicit connectors *******************/

    CU- = (CU);
    CO- = (CO);
    BR- = (BR);
    RESET_- = (RESET_);
    Q-.2 = (Q.2);
    Q-.1 = (Q.1);
    Q-.0 = (Q.0);
    LD_- = (LD_);
    CP- = (CP);
    DI-.2 = (DI.2);
    DI-.1 = (DI.1);
    DI-.0 = (DI.0);
    CD- = (CD);


  /* part instances **************************/

    U0.2(U0.Q-.2=Q) = FD2SA(U0.TI-.2=TI,RESET_-=CD,LD_-=TE,CP-=CP,
            U0.D-.2=D);
    U0.1(U0.Q-.1=Q) = FD2SA(U0.TI-.1=TI,RESET_-=CD,LD_-=TE,CP-=CP,
            U0.D-.1=D);
    U0.0(U0.Q-.0=Q) = FD2SA(U0.TI-.0=TI,RESET_-=CD,LD_-=TE,CP-=CP,
            U0.D-.0=D);
    U3(CO-=CO,BR-=BR,U3.STBIT2O-=STBIT2O,U3.STBIT1O-=STBIT1O,
            U3.STBIT0O-=STBIT0O) = CNT3UDCR(CD-=CD,CU-=CU,
            U3.STBIT0I-=STBIT0I,U3.STBIT1I-=STBIT1I,U3.STBIT2I-=STBIT2I);


  /* extractors ******************************/

    U0.TI-.2 = (U3.STBIT2O-);
    U0.TI-.1 = (U3.STBIT1O-);
```

```
    U0.Q-.0 = (U3.STBIT0I-);
    U0.Q-.0 = (Q-.2);
    U0.Q-.1 = (Q-.1);
    U0.Q-.2 = (Q-.0);
    U0.Q-.1 = (U3.STBIT1I-);
    U0.Q-.2 = (U3.STBIT2I-);
    U0.D-.0 = (DI-.2);
    U0.D-.1 = (DI-.1);
    U0.D-.2 = (DI-.0);
    U0.TI-.0 = (U3.STBIT0O-);

  /* type converters *********************/

ANNOTATIONS
{
  BUS BUS_TYPE = "DOT";
}

END MODULE;


/* * * * * * *  Contents of NET file RWORDFN.NET  * * * * * * */

/*******************************************************/
/*  Netlist copyright (C) 1989 LSI Logic Corporation   */
/*******************************************************/


MODULE RWORDFN;

INPUTS      CD,CLD,CP,CU,RESET_,RLD,S_MODE,UPDATE;

OUTPUTS     Q.2,Q.1,Q.0;

LEVEL FUNCTION;
DEFINE
  /* implicit connectors *******************/

    RESET_- = (RESET_);
    RESET_- = (RESET_);
    RLD- = (RLD);
    CD- = (CD);
    S_MODE- = (S_MODE);
    UPDATE- = (UPDATE);
    CU- = (CU);
    Q-.2 = (Q.2);
    Q-.1 = (Q.1);
    Q-.0 = (Q.0);
    CP- = (CP);
    CP- = (CP);
    CLD- = (CLD);


  /* part instances **************************/

    U4(U4.Z-=Z) = AND2A(CD-=A,S_MODE-=B);
    U2(U2.Z-=Z) = OR2B(UPDATE-=A,CU-=B);
    U1(U1.STBIT2O-=STBIT2O,U1.STBIT1O-=STBIT1O,U1.STBIT0O-=STBIT0O)
             = RWORDCR(U4.Z-=CD,U2.Z-=CU,U1.STBIT0I-=STBIT0I,
            U1.STBIT1I-=STBIT1I,U1.STBIT2I-=STBIT2I);
    U5.2(U5.Q-.2=Q) = FD2SA(RESET_-=CD,CP-=CP,RLD-=TE,Q-.2=TI,
            U5.Q-.2=D);
    U5.1(U5.Q-.1=Q) = FD2SA(RESET_-=CD,CP-=CP,RLD-=TE,Q-.1=TI,
            U5.Q-.1=D);
    U5.0(U5.Q-.0=Q) = FD2SA(RESET_-=CD,CP-=CP,RLD-=TE,Q-.0=TI,
            U5.Q-.0=D);
    U0.2(U0.Q-.2=Q) = FD2SA(RESET_-=CD,U5.Q-.2=TI,U0.D-.2=D,CP-=CP,
            CLD-=TE);
    U0.1(U0.Q-.1=Q) = FD2SA(RESET_-=CD,U5.Q-.1=TI,U0.D-.1=D,CP-=CP,
            CLD-=TE);
    U0.0(U0.Q-.0=Q) = FD2SA(RESET_-=CD,U5.Q-.0=TI,U0.D-.0=D,CP-=CP,
            CLD-=TE);
```

```
  /* extractors ******************************/

    U0.Q-.0 = (U1.STBIT0I-);
    U0.Q-.1 = (U1.STBIT1I-);
    U0.D-.2 = (U1.STBIT2O-);
    U0.D-.1 = (U1.STBIT1O-);
    U0.D-.0 = (U1.STBIT0O-);
    U0.Q-.2 = (U1.STBIT2I-);
    U0.Q-.0 = (Q-.2);
    U0.Q-.1 = (Q-.1);
    U0.Q-.2 = (Q-.0);


  /* type converters *********************/

ANNOTATIONS
{
  BUS BUS_TYPE = "DOT";
}

END MODULE;

/* * * * * * *  Contents of NET file MLCV1CR.NET  * * * * * * */

/******************************************************/
/*  Netlist copyright (C) 1989 LSI Logic Corporation  */
/******************************************************/


MODULE MLCV1CR;

INPUTS      CD,CU,NOL0,NOL1,NOL2,STBIT0I,STBIT1I,STBIT2I,STBIT3I,
            STBIT4I;
OUTPUTS     BR,CO,STBIT0O,STBIT1O,STBIT2O,STBIT3O,STBIT4O;

LEVEL FUNCTION;
DEFINE
  /* implicit connectors *******************/

    STBIT0O- = (STBIT0O);
    STBIT3I- = (STBIT3I);
    STBIT0I- = (STBIT0I);
    STBIT1I- = (STBIT1I);
    CD- = (CD);
    STBIT4I- = (STBIT4I);
    STBIT4O- = (STBIT4O);
    BR- = (BR);
    STBIT3O- = (STBIT3O);
    STBIT1O- = (STBIT1O);
    CO- = (CO);
    NOL2- = (NOL2);
    NOL0- = (NOL0);
    CU- = (CU);
    STBIT2I- = (STBIT2I);
    NOL1- = (NOL1);
    STBIT2O- = (STBIT2O);


  /* part instances **************************/

    M2(M2.Z-=Z) = N1D(STBIT3I-=A);
    M13(M13.Z-=Z) = N1D(STBIT0I-=A);
    M14(M14.Z-=Z) = N1D(STBIT1I-=A);
    M11(M11.Z-=Z) = N1D(CD-=A);
    M311(M311.Z-=Z) = N1D(M1.Z-=A);
    M1(M1.Z-=Z) = N1D(STBIT4I-=A);
    M320(M320.Z-=Z) = ND3B(M304.Z-=A,M305.Z-=B,M2.Z-=C);
    M70(M70.Z-=Z) = AND2B(M302.Z-=A,M14.Z-=B);
    M134(M134.Z-=Z) = AND2B(M14.Z-=A,M4.Z-=B);
    M162(M162.Z-=Z) = AND3B(M13.Z-=A,M14.Z-=B,M4.Z-=C);
    M223(M223.Z-=Z) = AND3B(M308.Z-=B,M307.Z-=A,M1.Z-=C);
    M322(M322.Z-=Z) = ND3B(M6.Z-=A,M305.Z-=B,M14.Z-=C);
    M315(M315.Z-=Z) = ND4B(M6.Z-=A,M11.Z-=B,M4.Z-=C,M311.Z-=D);
    M346(M346.Z-=Z) = AND2B(M132.Z-=B,M104.Z-=A);
```

```
M73(M73.Z==Z) = AND3B(M301.Z==C,M18.Z==A,M19.Z==B);
M161(M161.Z==Z) = AND3B(M6.Z==B,M304.Z==C,M297.Z==A);
M189(M189.Z==Z) = ND4B(M297.Z==A,M305.Z==B,M2.Z==C,M1.Z==D);
M257(M257.Z==Z) = AND2B(M14.Z==A,M1.Z==B);
M151(M151.Z==Z) = AND3B(M14.Z==A,M4.Z==B,M1.Z==C);
M152(M152.Z==Z) = ND3B(M151.Z==C,M133.Z==A,M46.Z==B);
M51(M51.Z==Z) = AND2B(M2.Z==B,M307.Z==A);
M45(M45.Z==Z) = AND2B(M302.Z==B,M18.Z==A);
M3(M3.Z==Z) = AND2B(M307.Z==A,M4.Z==B);
M183(M183.Z==Z) = AND2B(M11.Z==A,M4.Z==B);
M226(M226.Z==Z) = AND2B(M11.Z==A,M14.Z==B);
M228(M228.Z==Z) = ND3B(M226.Z==B,M182.Z==A,M34.Z==C);
M239(M239.Z==Z) = AND2B(M6.Z==A,M13.Z==B);
M22(M22.Z==Z) = AND2B(M308.Z==A,M310.Z==B);
M95(M95.Z==Z) = AND3B(M2.Z==B,M4.Z==A,M1.Z==C);
M398(M398.Z==Z) = AND2B(M164.Z==A,M169.Z==B);
M27(M27.Z==Z) = ND3B(M25.Z==B,M24.Z==A,M26.Z==C);
M169(M169.Z==Z) = ND3B(M25.Z==B,M24.Z==A,M34.Z==C);
M378(M378.Z==Z) = AND2B(M224.Z==B,M216.Z==A);
M208(M208.Z==Z) = ND3B(M310.Z==C,M187.Z==B,M53.Z==A);
M353(M353.Z==Z) = AND2B(M220.Z==B,M208.Z==A);
M377(M377.Z==Z) = AND2B(M212.Z==B,M208.Z==A);
M402(M402.Z==Z) = AND2B(M212.Z==A,M216.Z==B);
M210(M210.Z==Z) = AND2B(M11.Z==A,M307.Z==B);
M212(M212.Z==Z) = ND3B(M196.Z==C,M210.Z==B,M182.Z==A);
M196(M196.Z==Z) = AND3B(M2.Z==B,M308.Z==A,M1.Z==C);
M342(M342.Z==Z) = AND2B(M56.Z==A,M68.Z==B);
M68(M68.Z==Z) = ND3B(M55.Z==C,M65.Z==A,M54.Z==B);
M314(M314.Z==Z) = ND4B(M6.Z==A,M11.Z==B,M310.Z==D,M4.Z==C);
M361(M361.Z==Z) = AND2B(M296.Z==A,M314.Z==B);
M290(M290.Z==Z) = AND2B(M6.Z==A,M305.Z==B);
M292(M292.Z==Z) = ND3B(M310.Z==C,M290.Z==A,M3.Z==B);
M319(M319.Z==Z) = ND4B(M6.Z==A,M11.Z==B,M2.Z==D,M307.Z==C);
M369(M369.Z==Z) = AND2B(M132.Z==B,M120.Z==A);
M345(M345.Z==Z) = AND2B(M84.Z==A,M100.Z==B);
M366(M366.Z==Z) = AND2B(M78.Z==A,M92.Z==B);
M125(M125.Z==Z) = AND3B(M302.Z==C,M40.Z==B,M18.Z==A);
M38(M38.Z==Z) = AND2B(M305.Z==A,M14.Z==B);
M303(M303.Z==Z) = ND3B(M192.Z==B,M65.Z==A,M1.Z==C);
M387(M387.Z==Z) = AND2B(M303.Z==A,M306.Z==B);
M306(M306.Z==Z) = ND3B(M192.Z==B,M53.Z==A,M1.Z==C);
M190(M190.Z==Z) = AND2B(M11.Z==B,M301.Z==A);
M193(M193.Z==Z) = ND3B(M190.Z==A,M192.Z==C,M175.Z==B);
M192(M192.Z==Z) = AND2C(M2.Z==B,M308.Z==A);
M237(M237.Z==Z) = ND3B(M38.Z==B,M192.Z==C,M182.Z==A);
M36(M36.Z==Z) = AND2B(M18.Z==A,M19.Z==B);
M39(M39.Z==Z) = ND3B(M38.Z==C,M36.Z==A,M12.Z==B);
M273(M273.Z==Z) = ND3B(M310.Z==C,M38.Z==B,M65.Z==A);
M244(M244.Z==Z) = AND2B(M310.Z==B,M4.Z==A);
M300(M300.Z==Z) = ND4B(M302.Z==A,M304.Z==B,M13.Z==C,M311.Z==D);
M336(M336.Z==Z) = AND2B(M300.Z==A,M309.Z==B);
M309(M309.Z==Z) = ND3B(M244.Z==B,M5.Z==A,M1.Z==C);
M277(M277.Z==Z) = ND3B(M244.Z==B,M182.Z==A,M1.Z==C);
M358(M358.Z==Z) = AND2B(M273.Z==A,M277.Z==B);
M284(M284.Z==Z) = AND2B(M310.Z==B,M14.Z==A);
M246(M246.Z==Z) = AND2B(M302.Z==A,M13.Z==B);
M281(M281.Z==Z) = ND3B(M2.Z==C,M246.Z==A,M199.Z==B);
M285(M285.Z==Z) = ND3B(M284.Z==B,M246.Z==A,M1.Z==C);
M359(M359.Z==Z) = ND3B(M358.Z==B,M357.Z==A,M285.Z==C);
M262(M262.Z==Z) = ND3B(M199.Z==B,M71.Z==C,M5.Z==A);
M251(M251.Z==Z) = ND3B(M199.Z==B,M53.Z==A,M311.Z==C);
M382(M382.Z==Z) = AND2B(M251.Z==A,M262.Z==B);
M333(M333.Z==Z) = AND2B(M254.Z==A,M258.Z==B);
M386(M386.Z==Z) = AND2B(M289.Z==A,M299.Z==B);
M299(M299.Z==Z) = ND3B(M187.Z==B,M53.Z==A,M311.Z==C);
M335(M335.Z==Z) = ND3B(M334.Z==B,M333.Z==A,M299.Z==C);
M334(M334.Z==Z) = AND2B(M262.Z==A,M270.Z==B);
M270(M270.Z==Z) = ND3B(M199.Z==B,M9.Z==C,M5.Z==A);
M357(M357.Z==Z) = AND2B(M245.Z==A,M270.Z==B);
M278(M278.Z==Z) = ND4B(M6.Z==A,M307.Z==C,M13.Z==B,M310.Z==D);
M407(M407.Z==Z) = ND3B(M406.Z==B,M405.Z==A,M278.Z==C);
M406(M406.Z==Z) = AND2B(M245.Z==A,M266.Z==B);
M266(M266.Z==Z) = ND3B(M159.Z==B,M34.Z==C,M5.Z==A);
M159(M159.Z==Z) = AND2B(M308.Z==B,M307.Z==A);
```

```
M122(M122.Z-=Z) = AND3B(M302.Z-=A,M11.Z-=B,M13.Z-=C);
M155(M155.Z-=Z) = AND2B(M307.Z-=A,M311.Z-=B);
M156(M156.Z-=Z) = ND3B(M122.Z-=B,M121.Z-=A,M155.Z-=C);
M60(M60.Z-=Z) = ND3B(M55.Z-=C,M54.Z-=B,M12.Z-=A);
M424(M424.Z-=Z) = AND3B(M52.Z-=B,M48.Z-=A,M60.Z-=C);
M428(CO-=Z) = ND3B(M424.Z-=B,M423.Z-=A,M427.Z-=C);
M427(M427.Z-=Z) = NR2B(M425.Z-=A,M426.Z-=B);
M426(M426.Z-=Z) = ND2B(M156.Z-=A,M160.Z-=B);
M160(M160.Z-=Z) = ND3B(M122.Z-=B,M121.Z-=A,M159.Z-=C);
M121(M121.Z-=Z) = AND3B(M40.Z-=C,M18.Z-=A,M19.Z-=B);
M123(M123.Z-=Z) = AND2B(M307.Z-=A,M310.Z-=B);
M124(M124.Z-=Z) = ND3B(M122.Z-=B,M121.Z-=A,M123.Z-=C);
M425(M425.Z-=Z) = ND2B(M124.Z-=A,M128.Z-=B);
M128(M128.Z-=Z) = ND3B(M90.Z-=B,M125.Z-=A,M26.Z-=C);
M430(M430.Z-=Z) = AND2B(M108.Z-=B,M96.Z-=A);
M392(M392.Z-=Z) = AND2B(M96.Z-=A,M100.Z-=B);
M393(M393.Z-=Z) = ND3B(M108.Z-=C,M392.Z-=B,M391.Z-=A);
M391(M391.Z-=Z) = AND2B(M78.Z-=B,M17.Z-=A);
M312(M312.Z-=Z) = ND3B(M15.Z-=B,M12.Z-=A,M1.Z-=C);
M15(M15.Z-=Z) = AND2C(M13.Z-=A,M14.Z-=B);
M17(M17.Z-=Z) = ND3B(M16.Z-=C,M15.Z-=B,M12.Z-=A);
M16(M16.Z-=Z) = AND3B(M308.Z-=A,M310.Z-=B,M311.Z-=C);
M112(M112.Z-=Z) = ND3B(M90.Z-=B,M89.Z-=A,M16.Z-=C);
M367(M367.Z-=Z) = AND2B(M116.Z-=B,M104.Z-=A);
M63(M63.Z-=Z) = AND3B(M310.Z-=B,M4.Z-=A,M311.Z-=C);
M116(M116.Z-=Z) = ND3B(M90.Z-=B,M89.Z-=A,M63.Z-=C);
M91(M91.Z-=Z) = AND2B(M308.Z-=A,M1.Z-=B);
M92(M92.Z-=Z) = ND3B(M90.Z-=B,M89.Z-=A,M91.Z-=C);
M324(M324.Z-=Z) = AND2B(M88.Z-=A,M92.Z-=B);
M323(M323.Z-=Z) = AND2B(M10.Z-=A,M84.Z-=B);
M327(M327.Z-=Z) = NR2B(M325.Z-=A,M326.Z-=B);
M325(M325.Z-=Z) = ND3B(M324.Z-=B,M323.Z-=A,M100.Z-=C);
M100(M100.Z-=Z) = ND3B(M98.Z-=B,M97.Z-=A,M71.Z-=C);
M97(M97.Z-=Z) = AND3B(M302.Z-=B,M11.Z-=C,M301.Z-=A);
M370(M370.Z-=Z) = AND2B(M164.Z-=B,M140.Z-=A);
M395(M395.Z-=Z) = AND2B(M132.Z-=A,M140.Z-=B);
M140(M140.Z-=Z) = ND3B(M98.Z-=B,M97.Z-=A,M26.Z-=C);
M98(M98.Z-=Z) = AND3B(M307.Z-=B,M13.Z-=A,M4.Z-=C);
M28(M28.Z-=Z) = AND3B(M302.Z-=B,M11.Z-=C,M298.Z-=A);
M120(M120.Z-=Z) = ND3B(M98.Z-=B,M28.Z-=A,M26.Z-=C);
M394(M394.Z-=Z) = AND2B(M112.Z-=A,M120.Z-=B);
M396(M396.Z-=Z) = ND3B(M395.Z-=B,M394.Z-=A,M148.Z-=C);
M397(M397.Z-=Z) = NR2B(M393.Z-=A,M396.Z-=B);
M412(STBIT10-=Z) = ND3B(M397.Z-=A,M411.Z-=C,M404.Z-=B);
M411(M411.Z-=Z) = NR2B(M407.Z-=A,M410.Z-=B);
M410(M410.Z-=Z) = ND3B(M409.Z-=B,M408.Z-=A,M319.Z-=C);
M408(M408.Z-=Z) = AND2B(M292.Z-=A,M296.Z-=B);
M296(M296.Z-=Z) = ND3B(M310.Z-=C,M175.Z-=B,M65.Z-=A);
M65(M65.Z-=Z) = AND2C(M302.Z-=A,M304.Z-=B);
M245(M245.Z-=Z) = ND3B(M244.Z-=C,M65.Z-=A,M54.Z-=B);
M54(M54.Z-=Z) = AND2C(M305.Z-=A,M307.Z-=B);
M216(M216.Z-=Z) = ND3B(M196.Z-=C,M54.Z-=B,M5.Z-=A);
M328(M328.Z-=Z) = AND2B(M197.Z-=B,M177.Z-=A);
M330(M330.Z-=Z) = ND3B(M216.Z-=C,M329.Z-=B,M328.Z-=A);
M329(M329.Z-=Z) = AND2B(M212.Z-=B,M205.Z-=A);
M375(M375.Z-=Z) = AND2B(M201.Z-=A,M205.Z-=B);
M201(M201.Z-=Z) = ND3B(M199.Z-=B,M182.Z-=A,M71.Z-=C);
M351(M351.Z-=Z) = AND2B(M201.Z-=B,M197.Z-=A);
M352(M352.Z-=Z) = ND3B(M351.Z-=C,M350.Z-=B,M349.Z-=A);
M350(M350.Z-=Z) = AND2B(M173.Z-=B,M169.Z-=A);
M147(M147.Z-=Z) = AND3B(M2.Z-=B,M307.Z-=A,M311.Z-=C);
M85(M85.Z-=Z) = AND2B(M302.Z-=B,M301.Z-=A);
M173(M173.Z-=Z) = ND3B(M147.Z-=C,M85.Z-=A,M86.Z-=B);
M399(M399.Z-=Z) = AND2B(M173.Z-=A,M177.Z-=B);
M177(M177.Z-=Z) = ND3B(M95.Z-=C,M175.Z-=B,M12.Z-=A);
M175(M175.Z-=Z) = AND2C(M307.Z-=B,M13.Z-=A);
M197(M197.Z-=Z) = ND3B(M196.Z-=C,M175.Z-=B,M5.Z-=A);
M401(M401.Z-=Z) = AND2B(M193.Z-=A,M197.Z-=B);
M403(M403.Z-=Z) = ND3B(M220.Z-=C,M402.Z-=B,M401.Z-=A);
M404(M404.Z-=Z) = NR2B(M400.Z-=A,M403.Z-=B);
M400(M400.Z-=Z) = ND3B(M399.Z-=B,M398.Z-=A,M181.Z-=C);
M181(M181.Z-=Z) = ND3B(M24.Z-=A,M43.Z-=B,M26.Z-=C);
M43(M43.Z-=Z) = AND3B(M305.Z-=A,M308.Z-=C,M14.Z-=B);
M41(M41.Z-=Z) = AND2B(M40.Z-=B,M18.Z-=A);
```

```
M44(M44.Z--Z) = ND3B(M43.Z--C,M41.Z--A,M12.Z--B);
M423(M423.Z--Z) = AND3B(M39.Z--B,M23.Z--A,M44.Z--C);
M21(M21.Z--Z) = AND3B(M11.Z--A,M307.Z--C,M13.Z--B);
M20(M20.Z--Z) = AND3B(M302.Z--C,M18.Z--A,M19.Z--B);
M23(M23.Z--Z) = ND3B(M21.Z--B,M20.Z--A,M22.Z--C);
M241(M241.Z--Z) = ND3B(M239.Z--A,M22.Z--B,M311.Z--C);
M381(M381.Z--Z) = AND2B(M241.Z--A,M248.Z--B);
M248(M248.Z--Z) = ND3B(M246.Z--A,M199.Z--B,M1.Z--C);
M199(M199.Z--Z) = AND2C(M308.Z--B,M14.Z--A);
M289(M289.Z--Z) = ND3B(M310.Z--C,M199.Z--B,M53.Z--A);
M293(M293.Z--Z) = ND4B(M304.Z--A,M310.Z--C,M14.Z--B,M311.Z--D);
M360(M360.Z--Z) = AND2B(M289.Z--A,M293.Z--B);
M316(M316.Z--Z) = ND4B(M304.Z--A,M310.Z--C,M4.Z--B,M311.Z--D);
M362(M362.Z--Z) = ND3B(M361.Z--B,M360.Z--A,M316.Z--C);
M363(M363.Z--Z) = NR2B(M359.Z--A,M362.Z--B);
M364(STBIT3O--Z) = ND3B(M348.Z--A,M363.Z--C,M356.Z--B);
M356(M356.Z--Z) = NR2B(M352.Z--A,M355.Z--B);
M355(M355.Z--Z) = ND3B(M241.Z--C,M354.Z--B,M353.Z--A);
M354(M354.Z--Z) = AND2B(M228.Z--A,M232.Z--B);
M232(M232.Z--Z) = ND3B(M183.Z--B,M182.Z--A,M34.Z--C);
M254(M254.Z--Z) = ND3B(M183.Z--B,M182.Z--A,M1.Z--C);
M182(M182.Z--Z) = AND2C(M302.Z--B,M297.Z--A);
M185(M185.Z--Z) = ND3B(M183.Z--B,M182.Z--A,M26.Z--C);
M373(M373.Z--Z) = AND2B(M169.Z--A,M185.Z--B);
M376(M376.Z--Z) = ND3B(M375.Z--C,M374.Z--B,M373.Z--A);
M374(M374.Z--Z) = AND2B(M193.Z--B,M188.Z--A);
M186(M186.Z--Z) = AND2B(M11.Z--B,M298.Z--A);
M188(M188.Z--Z) = ND3B(M2.Z--C,M186.Z--A,M187.Z--B);
M187(M187.Z--Z) = AND2C(M308.Z--B,M13.Z--A);
M205(M205.Z--Z) = ND3B(M187.Z--B,M71.Z--C,M5.Z--A);
M5(M5.Z--Z) = AND2C(M6.Z--A,M304.Z--B);
M10(M10.Z--Z) = ND3B(M3.Z--B,M9.Z--C,M5.Z--A);
M48(M48.Z--Z) = ND3B(M45.Z--A,M3.Z--C,M46.Z--B);
M52(M52.Z--Z) = ND3B(M51.Z--C,M45.Z--A,M46.Z--B);
M46(M46.Z--Z) = AND2C(M305.Z--B,M11.Z--A);
M258(M258.Z--Z) = ND3B(M257.Z--C,M182.Z--A,M46.Z--B);
M419(M419.Z--Z) = ND4B(M245.Z--A,M273.Z--C,M258.Z--B,M286.Z--D);
M286(M286.Z--Z) = ND3B(M297.Z--A,M305.Z--B,M4.Z--C);
M297(M297.Z--Z) = N1C(M18.Z--A);
M18(M18.Z--Z) = N1C(NOL2--A);
M74(M74.Z--Z) = AND3B(M6.Z--A,M304.Z--B,M13.Z--C);
M84(M84.Z--Z) = ND3C(M79.Z--A,M74.Z--B,M77.Z--C);
M79(M79.Z--Z) = AND3B(M298.Z--B,M40.Z--C,M18.Z--A);
M40(M40.Z--Z) = N1C(NOL0--A);
M301(M301.Z--Z) = N1C(M40.Z--A);
M89(M89.Z--Z) = AND3C(M302.Z--C,M301.Z--B,M298.Z--A);
M104(M104.Z--Z) = ND3B(M90.Z--B,M89.Z--A,M55.Z--C);
M415(M415.Z--Z) = NR2B(M413.Z--A,M414.Z--B);
M414(M414.Z--Z) = ND3B(M96.Z--A,M112.Z--C,M104.Z--B);
M96(M96.Z--Z) = ND3B(M95.Z--C,M94.Z--B,M93.Z--A);
M93(M93.Z--Z) = AND3B(M6.Z--C,M301.Z--B,M298.Z--A);
M6(M6.Z--Z) = N1D(CU--A);
M302(M302.Z--Z) = N1D(M6.Z--A);
M53(M53.Z--Z) = AND2C(M6.Z--A,M11.Z--B);
M56(M56.Z--Z) = ND3B(M55.Z--C,M54.Z--B,M53.Z--A);
M55(M55.Z--Z) = AND3C(M2.Z--B,M308.Z--A,M311.Z--C);
M308(M308.Z--Z) = N1D(M4.Z--A);
M4(M4.Z--Z) = N1D(STBIT2I--A);
M75(M75.Z--Z) = ND2B(M14.Z--A,M4.Z--B);
M233(M233.Z--Z) = ND4B(M302.Z--B,M297.Z--A,M307.Z--C,M4.Z--D);
M405(M405.Z--Z) = AND2B(M224.Z--A,M233.Z--B);
M224(M224.Z--Z) = ND3B(M223.Z--C,M133.Z--A,M86.Z--B);
M133(M133.Z--Z) = AND2C(M302.Z--B,M298.Z--A);
M220(M220.Z--Z) = ND3B(M219.Z--C,M133.Z--A,M86.Z--B);
M219(M219.Z--Z) = AND3B(M307.Z--A,M310.Z--B,M1.Z--C);
M310(M310.Z--Z) = N1D(M2.Z--A);
M26(M26.Z--Z) = AND2C(M310.Z--A,M311.Z--B);
M31(M31.Z--Z) = ND3B(M25.Z--B,M28.Z--A,M26.Z--C);
M413(M413.Z--Z) = ND4B(M27.Z--A,M84.Z--C,M92.Z--D,M31.Z--B);
M429(M429.Z--Z) = AND2B(M78.Z--A,M84.Z--B);
M431(BR--Z) = ND3B(M430.Z--B,M164.Z--C,M429.Z--A);
M164(M164.Z--Z) = ND3C(M162.Z--B,M161.Z--A,M9.Z--C);
M9(M9.Z--Z) = AND2C(M2.Z--A,M1.Z--B);
M88(M88.Z--Z) = ND3B(M85.Z--A,M86.Z--B,M9.Z--C);
```

```
M86(M86.Z-=Z) = AND2C(M11.Z-=A,M13.Z-=B);
M148(M148.Z-=Z) = ND3B(M147.Z-=C,M133.Z-=A,M86.Z-=B);
M349(M349.Z-=Z) = AND2B(M144.Z-=A,M148.Z-=B);
M416(M416.Z-=Z) = ND4B(M116.Z-=A,M164.Z-=D,M144.Z-=B,M152.Z-=C);
M326(M326.Z-=Z) = ND4B(M108.Z-=A,M164.Z-=D,M132.Z-=B,M152.Z-=C);
M132(M132.Z-=Z) = ND3C(M25.Z-=B,M24.Z-=A,M71.Z-=C);
M24(M24.Z-=Z) = AND3C(M302.Z-=B,M297.Z-=A,M11.Z-=C);
M238(M238.Z-=Z) = ND4B(M302.Z-=A,M304.Z-=B,M14.Z-=C,M311.Z-=D);
M331(M331.Z-=Z) = ND4B(M220.Z-=A,M224.Z-=B,M251.Z-=D,M238.Z-=C);
M332(M332.Z-=Z) = NR2B(M330.Z-=A,M331.Z-=B);
M340(STBIT40-=Z) = ND3B(M327.Z-=A,M339.Z-=C,M332.Z-=B);
M339(M339.Z-=Z) = NR2B(M335.Z-=A,M338.Z-=B);
M338(M338.Z-=Z) = ND3B(M337.Z-=B,M336.Z-=A,M315.Z-=C);
M337(M337.Z-=Z) = AND2B(M312.Z-=A,M313.Z-=B);
M313(M313.Z-=Z) = ND4B(M302.Z-=A,M304.Z-=B,M4.Z-=C,M311.Z-=D);
M304(M304.Z-=Z) = N1D(M11.Z-=A);
M94(M94.Z-=Z) = AND3B(M304.Z-=A,M13.Z-=B,M14.Z-=C);
M108(M108.Z-=Z) = ND3B(M105.Z-=A,M95.Z-=C,M94.Z-=B);
M105(M105.Z-=Z) = AND3B(M6.Z-=C,M40.Z-=B,M19.Z-=A);
M19(M19.Z-=Z) = N1C(NOL1-=A);
M298(M298.Z-=Z) = N1C(M19.Z-=A);
M69(M69.Z-=Z) = AND2B(M301.Z-=B,M298.Z-=A);
M72(M72.Z-=Z) = ND3B(M70.Z-=B,M69.Z-=A,M71.Z-=C);
M343(M343.Z-=Z) = AND2B(M78.Z-=B,M72.Z-=A);
M78(M78.Z-=Z) = ND3C(M74.Z-=B,M73.Z-=A,M77.Z-=C);
M77(M77.Z-=Z) = NR2C(M76.Z-=B,M75.Z-=A);
M76(M76.Z-=Z) = ND2B(M2.Z-=A,M1.Z-=B);
M71(M71.Z-=Z) = AND2C(M310.Z-=A,M1.Z-=B);
M136(M136.Z-=Z) = ND3B(M134.Z-=B,M133.Z-=A,M71.Z-=C);
M347(M347.Z-=Z) = ND3B(M346.Z-=B,M345.Z-=A,M136.Z-=C);
M348(M348.Z-=Z) = NR2B(M344.Z-=A,M347.Z-=B);
M344(M344.Z-=Z) = ND3B(M343.Z-=C,M342.Z-=B,M341.Z-=A);
M341(M341.Z-=Z) = AND2B(M10.Z-=A,M35.Z-=B);
M35(M35.Z-=Z) = ND3B(M34.Z-=C,M15.Z-=B,M12.Z-=A);
M34(M34.Z-=Z) = AND2C(M2.Z-=A,M311.Z-=B);
M144(M144.Z-=Z) = ND3B(M142.Z-=B,M28.Z-=A,M34.Z-=C);
M142(M142.Z-=Z) = AND3B(M305.Z-=A,M14.Z-=B,M4.Z-=C);
M305(M305.Z-=Z) = N1D(M13.Z-=A);
M90(M90.Z-=Z) = AND3C(M305.Z-=B,M11.Z-=A,M14.Z-=C);
M12(M12.Z-=Z) = AND2C(M302.Z-=A,M11.Z-=B);
M64(M64.Z-=Z) = ND3B(M63.Z-=C,M15.Z-=B,M12.Z-=A);
M365(M365.Z-=Z) = AND2B(M10.Z-=A,M64.Z-=B);
M368(M368.Z-=Z) = ND3B(M367.Z-=C,M366.Z-=B,M365.Z-=A);
M372(M372.Z-=Z) = NR2B(M368.Z-=A,M371.Z-=B);
M371(M371.Z-=Z) = ND3B(M370.Z-=B,M369.Z-=A,M165.Z-=C);
M165(M165.Z-=Z) = ND4B(M302.Z-=A,M304.Z-=B,M308.Z-=D,M14.Z-=C);
M307(M307.Z-=Z) = N1D(M14.Z-=A);
M25(M25.Z-=Z) = AND3C(M308.Z-=C,M307.Z-=B,M13.Z-=A);
M282(M282.Z-=Z) = ND4B(M302.Z-=A,M304.Z-=B,M308.Z-=D,M13.Z-=C);
M385(M385.Z-=Z) = AND2B(M281.Z-=A,M282.Z-=B);
M388(M388.Z-=Z) = ND3B(M387.Z-=C,M386.Z-=B,M385.Z-=A);
M389(M389.Z-=Z) = NR2B(M384.Z-=A,M388.Z-=B);
M384(M384.Z-=Z) = ND3B(M383.Z-=C,M382.Z-=B,M381.Z-=A);
M383(M383.Z-=Z) = AND2B(M266.Z-=A,M274.Z-=B);
M274(M274.Z-=Z) = ND4B(M304.Z-=A,M308.Z-=C,M14.Z-=B,M311.Z-=D);
M318(M318.Z-=Z) = ND4B(M6.Z-=A,M307.Z-=B,M4.Z-=C,M311.Z-=D);
M409(M409.Z-=Z) = AND2B(M317.Z-=A,M318.Z-=B);
M317(M317.Z-=Z) = ND4B(M302.Z-=A,M304.Z-=B,M2.Z-=D,M307.Z-=C);
M321(M321.Z-=Z) = ND3B(M6.Z-=A,M305.Z-=B,M2.Z-=C);
M420(M420.Z-=Z) = ND4B(M292.Z-=A,M320.Z-=B,M322.Z-=D,M321.Z-=C);
M421(M421.Z-=Z) = NR2B(M419.Z-=A,M420.Z-=B);
M422(STBIT00-=Z) = ND3B(M415.Z-=A,M421.Z-=C,M418.Z-=B);
M418(M418.Z-=Z) = NR2B(M416.Z-=A,M417.Z-=B);
M417(M417.Z-=Z) = ND3B(M181.Z-=A,M189.Z-=B,M237.Z-=C);
M379(M379.Z-=Z) = ND3B(M378.Z-=B,M377.Z-=A,M237.Z-=C);
M380(M380.Z-=Z) = NR2B(M376.Z-=A,M379.Z-=B);
M390(STBIT20-=Z) = ND3B(M372.Z-=A,M389.Z-=C,M380.Z-=B);


/* extractors ******************************/


/* type converters *********************/
```

```
ANNOTATIONS
{
  BUS BUS_TYPE = "DOT";
}

END MODULE;


/* * * * * * *  Contents of NET file MLCV1FN.NET  * * * * * * */

/*****************************************************/
/*  Netlist copyright (C) 1989 LSI Logic Corporation  */
/*****************************************************/


MODULE MLCV1FN;

INPUTS      CD,CLD,CP,CU,D.4,D.3,D.2,D.1,D.0,NOL.2,NOL.1,NOL.0,
            RESET_;
OUTPUTS     BR,CO,Q.0,Q.1,Q.2,Q.3,Q.4;

LEVEL FUNCTION;
DEFINE
  /* implicit connectors ******************/

    NOL-.2 = (NOL.2);
    NOL-.1 = (NOL.1);
    NOL-.0 = (NOL.0);
    CD- = (CD);
    CU- = (CU);
    RESET_- = (RESET_);
    CO- = (CO);
    BR- = (BR);
    CP- = (CP);
    CP- = (CP);
    D-.4 = (D.4);
    D-.3 = (D.3);
    D-.2 = (D.2);
    D-.1 = (D.1);
    D-.0 = (D.0);
    CLD- = (CLD);
    Q-.4 = (Q.0);
    Q-.3 = (Q.1);
    Q-.2 = (Q.2);
    Q-.1 = (Q.3);
    Q-.0 = (Q.4);


  /* part instances **************************/

    U13(U13.Z-=Z) = B3A(RESET_-=A);
    U7(CO-=Q) = FD2A(U6.CO-=D,U13.Z-=CD,CP-=CP);
    U8(BR-=Q) = FD2A(U6.BR-=D,U13.Z-=CD,CP-=CP);
    U1.4(Q-.4=Q) = FD2SA(U13.Z-=CD,CP-=CP,D-.4=TI,CLD-=TE,U1.D-.4=D);
    U1.3(Q-.3=Q) = FD2SA(U13.Z-=CD,CP-=CP,D-.3=TI,CLD-=TE,U1.D-.3=D);
    U1.2(Q-.2=Q) = FD2SA(U13.Z-=CD,CP-=CP,D-.2=TI,CLD-=TE,U1.D-.2=D);
    U1.1(Q-.1=Q) = FD2SA(U13.Z-=CD,CP-=CP,D-.1=TI,CLD-=TE,U1.D-.1=D);
    U1.0(Q-.0=Q) = FD2SA(U13.Z-=CD,CP-=CP,D-.0=TI,CLD-=TE,U1.D-.0=D);
    U6(U6.BR-=BR,U6.CO-=CO,U6.STBIT0O-=STBIT0O,U6.STBIT1O-=STBIT1O,
            U6.STBIT2O-=STBIT2O,U6.STBIT3O-=STBIT3O,U6.STBIT4O-=STBIT4O)
             = MLCV1CR(U6.STBIT0I-=STBIT0I,U6.STBIT1I-=STBIT1I,
            U6.STBIT2I-=STBIT2I,U6.STBIT3I-=STBIT3I,U6.STBIT4I-=STBIT4I,
            U6.NOL1-=NOL1,U6.NOL2-=NOL2,U6.NOL0-=NOL0,CD-=CD,CU-=CU);


  /* extractors *****************************/

    Q-.0 = (U6.STBIT0I-);
    Q-.1 = (U6.STBIT1I-);
    Q-.3 = (U6.STBIT3I-);
    Q-.4 = (U6.STBIT4I-);
    NOL-.2 = (U6.NOL2-);
    NOL-.1 = (U6.NOL1-);
    NOL-.0 = (U6.NOL0-);
```

```
    U1.D-.0 = (U6.STBIT0O-);
    U1.D-.2 = (U6.STBIT2O-);
    U1.D-.1 = (U6.STBIT1O-);
    U1.D-.3 = (U6.STBIT3O-);
    U1.D-.4 = (U6.STBIT4O-);
    Q-.2 = (U6.STBIT2I-);

  /* type converters *********************/

ANNOTATIONS
{
  BUS BUS_TYPE = "DOT";
}

END MODULE;


/* * * * * * *  Contents of NET file BMYLCV2.NET  * * * * * * */

/*******************************************************/

/*  Netlist copyright (C) 1989 LSI Logic Corporation  */
/*******************************************************/


MODULE BMYLCV2;

INPUTS        CD,CLD,CP,CU,FD.2,FD.1,FD.0,HLD,NOL.2,NOL.1,NOL.0,
              RESET_,RLD,S_MODE,UPDT;
OUTPUTS       BMYL.4,BMYL.3,BMYL.2,BMYL.1,BMYL.0,COF_ADR.2,
              COF_ADR.1,COF_ADR.0,ROW_ORDER.2,ROW_ORDER.1,
              ROW_ORDER.0;

LEVEL FUNCTION;
DEFINE
  /* implicit connectors ********************/

    NOL-.2 = (NOL.2);
    NOL-.1 = (NOL.1);
    NOL-.0 = (NOL.0);
    CU- = (CU);
    CD- = (CD);
    CP- = (CP);
    CLD- = (CLD);
    CLD- = (CLD);
    CLD- = (CLD);
    S_MODE- = (S_MODE);
    UPDT- = (UPDT);
    CP- = (CP);
    ROW_ORDER-.2 = (ROW_ORDER.2);
    ROW_ORDER-.1 = (ROW_ORDER.1);
    ROW_ORDER-.0 = (ROW_ORDER.0);
    BRESET_- = (BRESET_);
    RLD- = (RLD);
    CP- = (CP);
    BMYL-.0 = (BMYL.4);
    BMYL-.1 = (BMYL.3);
    BMYL-.2 = (BMYL.2);
    BMYL-.3 = (BMYL.1);
    BMYL-.4 = (BMYL.0);
    BRESET_- = (BRESET_);
    RESET_- = (RESET_);
    BRESET_- = (BRESET_);
    BRESET_- = (BRESET_);
    BRESET_- = (BRESET_);
    BRESET_- = (BRESET_);
    RLD- = (RLD);
    RLD- = (RLD);
    COF_ADR-.2 = (COF_ADR.2);
    COF_ADR-.1 = (COF_ADR.1);
    COF_ADR-.0 = (COF_ADR.0);
    COF_ADR-.2 = (COF_ADR.2);
    COF_ADR-.1 = (COF_ADR.1);
```

```
    COF_ADR-.0 = (COF_ADR.0);
    FD-.2 = (FD.2);
    FD-.1 = (FD.1);
    FD-.0 = (FD.0);
    HLD- = (HLD);
    CP- = (CP);
    CP- = (CP);
    UPDT- = (UPDT);

  /* part instances **************************/
    U7(U7.Z-=Z) = N1B(CLD-=A);
    U2.4(U2.Q-.4=Q) = FD2SA(BRESET_-=CD,U2.Q-.4=D,RLD-=TE,CP-=CP,
            BMYL-.0=TI);
    U2.3(U2.Q-.3=Q) = FD2SA(BRESET_-=CD,U2.Q-.3=D,RLD-=TE,CP-=CP,
            BMYL-.1=TI);
    U2.2(U2.Q-.2=Q) = FD2SA(BRESET_-=CD,U2.Q-.2=D,RLD-=TE,CP-=CP,
            BMYL-.2=TI);
    U2.1(U2.Q-.1=Q) = FD2SA(BRESET_-=CD,U2.Q-.1=D,RLD-=TE,CP-=CP,
            BMYL-.3=TI);
    U2.0(U2.Q-.0=Q) = FD2SA(BRESET_-=CD,U2.Q-.0=D,RLD-=TE,CP-=CP,
            BMYL-.4=TI);
    U1(BRESET_-=Z) = B3A(RESET_-=A);
    U10(ROW_ORDER-.2=Q.2,ROW_ORDER-.1=Q.1,ROW_ORDER-.0=Q.0) =
            RWORDFN(RLD-=RLD,CLD-=CLD,U5.CO-=CU,U5.BR-=CD,S_MODE-=S_MODE,
            UPDT-=UPDATE,CP-=CP,BRESET_-=RESET_);
    U4.2(U4.Q-.2=Q) = FD2SA(BRESET_-=CD,U4.Q-.2=D,CP-=CP,RLD-=TE,
            COF_ADR-.2=TI);
    U4.1(U4.Q-.1=Q) = FD2SA(BRESET_-=CD,U4.Q-.1=D,CP-=CP,RLD-=TE,
            COF_ADR-.1=TI);
    U4.0(U4.Q-.0=Q) = FD2SA(BRESET_-=CD,U4.Q-.0=D,CP-=CP,RLD-=TE,
            COF_ADR-.0=TI);
    U8.2(U8.Z-.2=Z) = N1B(U9.Z-.2=A);
    U8.1(U8.Z-.1=Z) = N1B(U9.Z-.1=A);
    U8.0(U8.Z-.0=Z) = N1B(U9.Z-.0=A);
    U9.2(U9.Z-.2=Z) = MX21LB(U4.Q-.2=B,HLD-=S,FD-.2=A);
    U9.1(U9.Z-.1=Z) = MX21LB(U4.Q-.1=B,HLD-=S,FD-.1=A);
    U9.0(U9.Z-.0=Z) = MX21LB(U4.Q-.0=B,HLD-=S,FD-.0=A);
    U6(U6.Z-=Z) = AND2B(U7.Z-=B,HLD-=A);
    U5(COF_ADR-.2=Q.2,COF_ADR-.1=Q.1,COF_ADR-.0=Q.0,U5.BR-=BR,
            U5.CO-=CO) = CNT3UDFN(BRESET_-=RESET_,CP-=CP,CU-=CU,CD-=CD,
            U8.Z-.2=DI.2,U8.Z-.1=DI.1,U8.Z-.0=DI.0,U6.Z-=LD_);
    U3(BMYL-.0=Q.0,BMYL-.1=Q.1,BMYL-.2=Q.2,BMYL-.3=Q.3,BMYL-.4=Q.4)
             = MLCV1FN(CLD-=CLD,NOL-.2=NOL.2,NOL-.1=NOL.1,NOL-.0=NOL.0,
            U0.Z-=CU,U5.BR-=CD,U2.Q-.4=D.4,U2.Q-.3=D.3,U2.Q-.2=D.2,
            U2.Q-.1=D.1,U2.Q-.0=D.0,BRESET_-=RESET_,CP-=CP);
    U0(U0.Z-=Z) = OR2B(U5.CO-=A,UPDT-=B);

  /* extractors ******************************/


  /* type converters *********************/

ANNOTATIONS
{
  BUS BUS_TYPE = "DOT";
}

END MODULE;


/* * * * * * *  Contents of NET file YAUV2.NET  * * * * * * */

/*****************************************************/
/*  Netlist copyright (C) 1989 LSI Logic Corporation  */
/*****************************************************/


MODULE YAUV2;

INPUTS      CLRYAU,CP,DH_CS_,DL_CS_,ENYAU,FRSTROW,LIM,LSTROW,
            LSTROW_1,LS_1,NOL.2,NOL.1,NOL.0,PDI.15,PDI.14,PDI.13,
```

```
           PDI.12,PDI.11,PDI.10,PDI.9,PDI.8,PDI.7,PDI.6,PDI.5,
           PDI.4,PDI.3,PDI.2,PDI.1,PDI.0,RESET_,RND_EN,SCNDROW,
           SCNIN,S_MODE,TEST,WR_,YDWN,YINCEN,YUP;
OUTPUTS    BMYL.4,BMYL.3,BMYL.2,BMYL.1,BMYL.0,COF_ADR.2,
           COF_ADR.1,COF_ADR.0,EOR,INCY,ROW_ORDER.2,ROW_ORDER.1,
           ROW_ORDER.0,YINT,YINTSND;

LEVEL FUNCTION;
DEFINE
  /* implicit connectors ******************/

    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    DH_CS_- = (DH_CS_);
    DL_CS_- = (DL_CS_);
    TEST- = (TEST);
    WR_- = (WR_);
    ROW_ORDER-.2 = (ROW_ORDER.2);
    ROW_ORDER-.1 = (ROW_ORDER.1);
    ROW_ORDER-.0 = (ROW_ORDER.0);
    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    NOL-.2 = (NOL.2);
    NOL-.1 = (NOL.1);
    NOL-.0 = (NOL.0);
    YUP- = (YUP);
    YDWN- = (YDWN);
    RND_EN- = (RND_EN);
    LS_1- = (LS_1);
    LIM- = (LIM);
    BRESET_- = (BRESET_);
    EOR- = (EOR);
    INCY- = (INCY);
    YINTSND- = (YINTSND);
    YINCEN- = (YINCEN);
    ENYAU- = (ENYAU);
    CLRYAU- = (CLRYAU);
    LSTROW- = (LSTROW);
    SCNDROW- = (SCNDROW);
    FRSTROW- = (FRSTROW);
    LSTROW_1- = (LSTROW_1);
    YINT- = (YINT);
    CP- = (CP);
    HLD- = (HLD);
    HLD- = (HLD);
    HLD- = (HLD);
    DCR_- = (DCR_);
    DCR_- = (DCR_);
    M-0 = (NC/1/);
    M-1 = (NC/0/);
    ACC-.22 = (ACC.22);
    ACC-.21 = (ACC.21);
    ACC-.20 = (ACC.20);
    ACC-.19 = (ACC.19);
    ACC-.18 = (ACC.18);
    ACC-.17 = (ACC.17);
    ACC-.16 = (ACC.16);
```

```
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
ACC-.3 = (ACC.3);
ACC-.2 = (ACC.2);
ACC-.1 = (ACC.1);
ACC-.0 = (ACC.0);
ACC-.22 = (ACC.22);
ACC-.21 = (ACC.21);
ACC-.20 = (ACC.20);
ACC-.19 = (ACC.19);
ACC-.18 = (ACC.18);
ACC-.17 = (ACC.17);
ACC-.16 = (ACC.16);
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
ACC-.3 = (ACC.3);
ACC-.2 = (ACC.2);
ACC-.1 = (ACC.1);
ACC-.0 = (ACC.0);
ACC-.22 = (ACC.22);
ACC-.21 = (ACC.21);
ACC-.20 = (ACC.20);
ACC-.19 = (ACC.19);
ACC-.18 = (ACC.18);
ACC-.17 = (ACC.17);
ACC-.16 = (ACC.16);
ACC-.15 = (ACC.15);
ACC-.14 = (ACC.14);
ACC-.13 = (ACC.13);
ACC-.12 = (ACC.12);
ACC-.11 = (ACC.11);
ACC-.10 = (ACC.10);
ACC-.9 = (ACC.9);
ACC-.8 = (ACC.8);
ACC-.7 = (ACC.7);
ACC-.6 = (ACC.6);
ACC-.5 = (ACC.5);
ACC-.4 = (ACC.4);
ACC-.3 = (ACC.3);
ACC-.2 = (ACC.2);
ACC-.1 = (ACC.1);
ACC-.0 = (ACC.0);
CP- = (CP);
CP- = (CP);
CP- = (CP);
COF_ADR-.2 = (COF_ADR.2);
COF_ADR-.1 = (COF_ADR.1);
COF_ADR-.0 = (COF_ADR.0);
S_MODE- = (S_MODE);
S_MODE- = (S_MODE);
CLR_- = (CLR_);
CLR_- = (CLR_);
BRESET_- = (BRESET_);
RESET_- = (RESET_);
```

```
BRESET_- = (BRESET_);
BRESET_- = (BRESET_);
SCNIN- = (SCNIN);


/* part instances ***************************/

U7(U7.Z--Z) = OR2B(U7.A--A,U7.B--B);
U9(U9.Z-.22=Z.22,U9.Z-.21=Z.21,U9.Z-.20=Z.20,U9.Z-.19=Z.19,
        U9.Z-.18=Z.18,U9.Z-.17=Z.17,U9.Z-.16=Z.16,U9.Z-.15=Z.15,
        U9.Z-.14=Z.14,U9.Z-.13=Z.13,U9.Z-.12=Z.12,U9.Z-.11=Z.11,
        U9.Z-.10=Z.10,U9.Z-.9=Z.9,U9.Z-.8=Z.8,U9.Z-.7=Z.7,
        U9.Z-.6=Z.6,U9.Z-.5=Z.5,U9.Z-.4=Z.4,U9.Z-.3=Z.3,
        U9.Z-.2=Z.2,U9.Z-.1=Z.1,U9.Z-.0=Z.0) = MUX2X1W23(
        U10.Q-.22=A.22,U10.Q-.21=A.21,U10.Q-.20=A.20,
        U10.Q-.19=A.19,U10.Q-.18=A.18,U10.Q-.17=A.17,
        U10.Q-.16=A.16,U10.Q-.15=A.15,U10.Q-.14=A.14,
        U10.Q-.13=A.13,U10.Q-.12=A.12,U10.Q-.11=A.11,
        U10.Q-.10=A.10,U10.Q-.9=A.9,U10.Q-.8=A.8,U10.Q-.7=A.7,
        U10.Q-.6=A.6,U10.Q-.5=A.5,U10.Q-.4=A.4,U10.Q-.3=A.3,
        U10.Q-.2=A.2,U10.Q-.1=A.1,U10.Q-.0=A.0,DCR_--S,
        U9.B-.22=B.22,U9.B-.21=B.21,U9.B-.20=B.20,U9.B-.19=B.19,
        U9.B-.18=B.18,U9.B-.17=B.17,U9.B-.16=B.16,U9.B-.15=B.15,
        U9.B-.14=B.14,U9.B-.13=B.13,U9.B-.12=B.12,U9.B-.11=B.11,
        U9.B-.10=B.10,U9.B-.9=B.9,U9.B-.8=B.8,U9.B-.7=B.7,
        U9.B-.6=B.6,U9.B-.5=B.5,U9.B-.4=B.4,U9.B-.3=B.3,
        U9.B-.2=B.2,U9.B-.1=B.1,U9.B-.0=B.0);
U8(ACC-.22=S.22,ACC-.21=S.21,ACC-.20=S.20,ACC-.19=S.19,ACC-.18=S.18,
        ACC-.17=S.17,ACC-.16=S.16,ACC-.15=S.15,ACC-.14=S.14,
        ACC-.13=S.13,ACC-.12=S.12,ACC-.11=S.11,ACC-.10=S.10,
        ACC-.9=S.9,ACC-.8=S.8,ACC-.7=S.7,ACC-.6=S.6,ACC-.5=S.5,
        ACC-.4=S.4,ACC-.3=S.3,ACC-.2=S.2,ACC-.1=S.1,ACC-.0=S.0)
         = ADD23F(U0.Q-.22=B.22,U0.Q-.21=B.21,U0.Q-.20=B.20,
        U0.Q-.19=B.19,U0.Q-.18=B.18,U0.Q-.17=B.17,U0.Q-.16=B.16,
        U0.Q-.15=B.15,U0.Q-.14=B.14,U0.Q-.13=B.13,U0.Q-.12=B.12,
        U0.Q-.11=B.11,U0.Q-.10=B.10,U0.Q-.9=B.9,U0.Q-.8=B.8,
        U0.Q-.7=B.7,U0.Q-.6=B.6,U0.Q-.5=B.5,U0.Q-.4=B.4,
        U0.Q-.3=B.3,U0.Q-.2=B.2,U0.Q-.1=B.1,U0.Q-.0=B.0,
        U9.Z-.22=A.22,U9.Z-.21=A.21,U9.Z-.20=A.20,U9.Z-.19=A.19,
        U9.Z-.18=A.18,U9.Z-.17=A.17,U9.Z-.16=A.16,U9.Z-.15=A.15,
        U9.Z-.14=A.14,U9.Z-.13=A.13,U9.Z-.12=A.12,U9.Z-.11=A.11,
        U9.Z-.10=A.10,U9.Z-.9=A.9,U9.Z-.8=A.8,U9.Z-.7=A.7,
        U9.Z-.6=A.6,U9.Z-.5=A.5,U9.Z-.4=A.4,U9.Z-.3=A.3,
        U9.Z-.2=A.2,U9.Z-.1=A.1,U9.Z-.0=A.0);
        U0.22(U0.Q-.22=Q) = FD2SA(CP--CP,HLD--TE,ACC-.22=D,CLR_--CD,
                U0.Q-.22=TI);
        U0.21(U0.Q-.21=Q) = FD2SA(CP--CP,HLD--TE,ACC-.21=D,CLR_--CD,
                U0.Q-.21=TI);
        U0.20(U0.Q-.20=Q) = FD2SA(CP--CP,HLD--TE,ACC-.20=D,CLR_--CD,
                U0.Q-.20=TI);
        U0.19(U0.Q-.19=Q) = FD2SA(CP--CP,HLD--TE,ACC-.19=D,CLR_--CD,
                U0.Q-.19=TI);
        U0.18(U0.Q-.18=Q) = FD2SA(CP--CP,HLD--TE,ACC-.18=D,CLR_--CD,
                U0.Q-.18=TI);
        U0.17(U0.Q-.17=Q) = FD2SA(CP--CP,HLD--TE,ACC-.17=D,CLR_--CD,
                U0.Q-.17=TI);
        U0.16(U0.Q-.16=Q) = FD2SA(CP--CP,HLD--TE,ACC-.16=D,CLR_--CD,
                U0.Q-.16=TI);
        U0.15(U0.Q-.15=Q) = FD2SA(CP--CP,HLD--TE,ACC-.15=D,CLR_--CD,
                U0.Q-.15=TI);
        U0.14(U0.Q-.14=Q) = FD2SA(CP--CP,HLD--TE,ACC-.14=D,CLR_--CD,
                U0.Q-.14=TI);
        U0.13(U0.Q-.13=Q) = FD2SA(CP--CP,HLD--TE,ACC-.13=D,CLR_--CD,
                U0.Q-.13=TI);
        U0.12(U0.Q-.12=Q) = FD2SA(CP--CP,HLD--TE,ACC-.12=D,CLR_--CD,
                U0.Q-.12=TI);
        U0.11(U0.Q-.11=Q) = FD2SA(CP--CP,HLD--TE,ACC-.11=D,CLR_--CD,
                U0.Q-.11=TI);
        U0.10(U0.Q-.10=Q) = FD2SA(CP--CP,HLD--TE,ACC-.10=D,CLR_--CD,
                U0.Q-.10=TI);
        U0.9(U0.Q-.9=Q) = FD2SA(CP--CP,HLD--TE,ACC-.9=D,CLR_--CD,U0.Q-.9=TI);
        U0.8(U0.Q-.8=Q) = FD2SA(CP--CP,HLD--TE,ACC-.8=D,CLR_--CD,U0.Q-.8=TI);
        U0.7(U0.Q-.7=Q) = FD2SA(CP--CP,HLD--TE,ACC-.7=D,CLR_--CD,U0.Q-.7=TI);
        U0.6(U0.Q-.6=Q) = FD2SA(CP--CP,HLD--TE,ACC-.6=D,CLR_--CD,U0.Q-.6=TI);
```

```
U0.5(U0.Q-.5=Q) = FD2SA(CP-=CP,HLD-=TE,ACC-.5=D,CLR_-=CD,U0.Q-.5=TI);
U0.4(U0.Q-.4=Q) = FD2SA(CP-=CP,HLD-=TE,ACC-.4=D,CLR_-=CD,U0.Q-.4=TI);
U0.3(U0.Q-.3=Q) = FD2SA(CP-=CP,HLD-=TE,ACC-.3=D,CLR_-=CD,U0.Q-.3=TI);
U0.2(U0.Q-.2=Q) = FD2SA(CP-=CP,HLD-=TE,ACC-.2=D,CLR_-=CD,U0.Q-.2=TI);
U0.1(U0.Q-.1=Q) = FD2SA(CP-=CP,HLD-=TE,ACC-.1=D,CLR_-=CD,U0.Q-.1=TI);
U0.0(U0.Q-.0=Q) = FD2SA(CP-=CP,HLD-=TE,ACC-.0=D,CLR_-=CD,U0.Q-.0=TI);
U4(YINT-=Z) = OR2C(U5.Z-=A,CP-=B);
U5(U5.Z-=Z) = N1B(U2.CE-=A);
U2(EOR-=EOR,INCY-=INCY,YINTSND-=YINTSND,DCR_-=DCR_,HLD-=HLD,
        U2.RST_-=RST_,U2.CE-=CE,U2.RLD-=RLD,U2.CLD-=CLD) =
        YAUCNTV4FN(LS_1-=LS_1,LIM-=LIM,BRESET_-=RESET_,CP-=CP,
        YINCEN-=YINCEN,ENYAU-=ENYAU,CLRYAU-=CLRYAU,LSTROW-=LR,
        SCNDROW-=SR,FRSTROW-=FR,U1.Z-=YINT,U7.Z-=YINT_1,
        LSTROW_1-=LR_1);
U1(U1.Z-=Z) = OR3B(U1.A-=A,U7.A-=B,U7.B-=C);
U15(U15.Y-.2=Y.2,U15.Y-.1=Y.1,U15.Y-.0=Y.0) = INCR3(RND_EN-=EN,
        U15.CIN-=CIN,U15.A-.2=A.2,U15.A-.1=A.1,U15.A-.0=A.0);
U12.2(COF_ADR-.2=Z) = N1C(U13.Z-.2=A);
U12.1(COF_ADR-.1=Z) = N1C(U13.Z-.1=A);
U12.0(COF_ADR-.0=Z) = N1C(U13.Z-.0=A);
U13.2(U13.Z-.2=Z) = MX21LB(U15.Y-.2=A,S_MODE-=S,U3.COF_ADR-.2=B);
U13.1(U13.Z-.1=Z) = MX21LB(U15.Y-.1=A,S_MODE-=S,U3.COF_ADR-.1=B);
U13.0(U13.Z-.0=Z) = MX21LB(U15.Y-.0=A,S_MODE-=S,U3.COF_ADR-.0=B);
U3(ROW_ORDER-.2=ROW_ORDER.2,ROW_ORDER-.1=ROW_ORDER.1,
        ROW_ORDER-.0=ROW_ORDER.0,BMYL-.4=BMYL.4,BMYL-.3=BMYL.3,
        BMYL-.2=BMYL.2,BMYL-.1=BMYL.1,BMYL-.0=BMYL.0,
        U3.COF_ADR-.2=COF_ADR.2,U3.COF_ADR-.1=COF_ADR.1,
        U3.COF_ADR-.0=COF_ADR.0) = BMYLCV2(CLR_-=RESET_,CP-=CP,
        U2.CLD-=CLD,U2.RLD-=RLD,U2.CE-=UPDT,U3.FD-.2=FD.2,
        U3.FD-.1=FD.1,U3.FD-.0=FD.0,HLD-=HLD,NOL-.2=NOL.2,
        NOL-.1=NOL.1,NOL-.0=NOL.0,YUP-=CU,YDWN-=CD,S_MODE-=S_MODE);
U6(CLR_-=Z) = AND2B(U2.RST_-=B,BRESET_-=A);
U14(BRESET_-=Z) = B3A(RESET_-=A);
U10(U10.Q-.22=Q.22,U10.Q-.21=Q.21,U10.Q-.20=Q.20,U10.Q-.19=Q.19,
U10.Q-.18=Q.18,U10.Q-.17=Q.17,U10.Q-.16=Q.16,
U10.Q-.15=Q.15,U10.Q-.14=Q.14,U10.Q-.13=Q.13,
U10.Q-.12=Q.12,U10.Q-.11=Q.11,U10.Q-.10=Q.10,U10.Q-.9=Q.9,
U10.Q-.8=Q.8,U10.Q-.7=Q.7,U10.Q-.6=Q.6,U10.Q-.5=Q.5,
U10.Q-.4=Q.4,U10.Q-.3=Q.3,U10.Q-.2=Q.2,U10.Q-.1=Q.1,
U10.Q-.0=Q.0) = REG23(PDI-.15=PDI.15,PDI-.14=PDI.14,
PDI-.13=PDI.13,PDI-.12=PDI.12,PDI-.11=PDI.11,PDI-.10=PDI.10,
PDI-.9=PDI.9,PDI-.8=PDI.8,PDI-.7=PDI.7,PDI-.6=PDI.6,
PDI-.5=PDI.5,PDI-.4=PDI.4,PDI-.3=PDI.3,PDI-.2=PDI.2,
PDI-.1=PDI.1,PDI-.0=PDI.0,DH_CS_-=DH_CS_,DL_CS_-=DL_CS_,
SCNIN-=SCNIN,TEST-=TEST,WR_-=CP,BRESET_-=RESET_);


/* extractors ******************************/

  U0.Q-.16 = (U15.CIN-);
  U0.Q-.20 = (U1.A-);
  U0.Q-.22 = (U7.B-);
  U9.B-.20 = (M-0);
  U9.B-.22 = (M-0);
  U9.B-.21 = (M-0);
  U9.B-.0 = (M-1);
  U9.B-.9 = (M-1);
  U9.B-.1 = (M-1);
  U9.B-.5 = (M-1);
  U9.B-.16 = (M-1);
  U9.B-.18 = (M-1);
  U9.B-.7 = (M-1);
  U9.B-.15 = (M-1);
  U9.B-.8 = (M-1);
  U9.B-.11 = (M-1);
  U9.B-.4 = (M-1);
  U9.B-.12 = (M-1);
  U9.B-.2 = (M-1);
  U9.B-.13 = (M-1);
  U9.B-.14 = (M-1);
  U9.B-.10 = (M-1);
  U9.B-.3 = (M-1);
  U9.B-.19 = (M-1);
  U9.B-.6 = (M-1);
```

```
    U9.B-.17 = (M-1);
    ACC-.19 = (U3.FD-.2);
    ACC-.18 = (U3.FD-.1);
    ACC-.17 = (U3.FD-.0);
    U0.Q-.21 = (U7.A-);
    U0.Q-.19 = (U15.A-.2);
    U0.Q-.18 = (U15.A-.1);
    U0.Q-.17 = (U15.A-.0);


  /* type converters *********************/

ANNOTATIONS
{
  BUS BUS_TYPE = "DOT";
}

END MODULE;



/* * * * * * *  Contents of NET file ADLY.NET  * * * * * * */

/*******************************************************/

/*  Netlist copyright (C) 1989 LSI Logic Corporation  */
/*******************************************************/


MODULE ADLY;

INPUTS      CP,D,DLY_POL,NOS.1,NOS.0,RESET_,WAIT;
OUTPUTS     QD;

LEVEL FUNCTION;
DEFINE
  /* implicit connectors *******************/

    CP- = (CP);
    RESET_- = (RESET_);
    WAIT- = (WAIT);
    D- = (D);
    DLY_POL- = (DLY_POL);
    QD- = (QD);
    NOS-.1 = (NOS.1);
    NOS-.0 = (NOS.0);
    D- = (D);


  /* part instances *************************/

    U2(U2.Z-=Z) = B3A(WAIT-=A);
    U1.17(U1.Q-.17=Q) = FD2SA(U1.D-.17=D,U1.Q-.17=TI,CP-=CP,RESET_-=CD,
            U2.Z-=TE);
    U1.16(U1.Q-.16=Q) = FD2SA(U1.D-.16=D,U1.Q-.16=TI,CP-=CP,RESET_-=CD,
            U2.Z-=TE);
    U1.15(U1.Q-.15=Q) = FD2SA(U1.D-.15=D,U1.Q-.15=TI,CP-=CP,RESET_-=CD,
            U2.Z-=TE);
    U1.14(U1.Q-.14=Q) = FD2SA(U1.D-.14=D,U1.Q-.14=TI,CP-=CP,RESET_-=CD,
            U2.Z-=TE);
    U1.13(U1.Q-.13=Q) = FD2SA(U1.D-.13=D,U1.Q-.13=TI,CP-=CP,RESET_-=CD,
            U2.Z-=TE);
    U1.12(U1.Q-.12=Q) = FD2SA(U1.D-.12=D,U1.Q-.12=TI,CP-=CP,RESET_-=CD,
            U2.Z-=TE);
    U1.11(U1.Q-.11=Q) = FD2SA(U1.D-.11=D,U1.Q-.11=TI,CP-=CP,RESET_-=CD,
            U2.Z-=TE);
    U1.10(U1.Q-.10=Q) = FD2SA(U1.D-.10=D,U1.Q-.10=TI,CP-=CP,RESET_-=CD,
            U2.Z-=TE);
    U1.9(U1.Q-.9=Q) = FD2SA(U1.D-.9=D,U1.Q-.9=TI,CP-=CP,RESET_-=CD,
            U2.Z-=TE);
    U1.8(U1.Q-.8=Q) = FD2SA(U1.D-.8=D,U1.Q-.8=TI,CP-=CP,RESET_-=CD,
            U2.Z-=TE);
    U1.7(U1.Q-.7=Q) = FD2SA(U1.D-.7=D,U1.Q-.7=TI,CP-=CP,RESET_-=CD,
            U2.Z-=TE);
    U1.6(U1.Q-.6=Q) = FD2SA(U1.D-.6=D,U1.Q-.6=TI,CP-=CP,RESET_-=CD,
            U2.Z-=TE);
```

```
    U1.5(U1.Q-.5=Q) = FD2SA(U1.D-.5=D,U1.Q-.5=TI,CP-=CP,RESET_-=CD,
            U2.Z-=TE);
    U1.4(U1.Q-.4=Q) = FD2SA(U1.D-.4=D,U1.Q-.4=TI,CP-=CP,RESET_-=CD,
            U2.Z-=TE);
    U1.3(U1.Q-.3=Q) = FD2SA(U1.D-.3=D,U1.Q-.3=TI,CP-=CP,RESET_-=CD,
            U2.Z-=TE);
    U1.2(U1.Q-.2=Q) = FD2SA(U1.D-.2=D,U1.Q-.2=TI,CP-=CP,RESET_-=CD,
            U2.Z-=TE);
    U1.1(U1.Q-.1=Q) = FD2SA(U1.D-.1=D,U1.Q-.1=TI,CP-=CP,RESET_-=CD,
            U2.Z-=TE);
    U1.0(U1.Q-.0=Q) = FD2SA(U1.D-.0=D,U1.Q-.0=TI,CP-=CP,RESET_-=CD,
            U2.Z-=TE);
    U0(QD-=Z) = MUX81HB(D-=D1,U0.D2-=D2,U0.D3-=D3,U0.D4-=D4,U0.D5-=D5,
            U0.D6-=D6,U0.D7-=D7,D-=D0,DLY_POL-=A,U0.B-=B,U0.C-=C);

  /* extractors *****************************/

    U1.Q-.5 = (U0.D3-);
    U1.Q-.8 = (U0.D4-);
    U1.Q-.11 = (U0.D5-);
    U1.Q-.13 = (U0.D6-);
    U1.Q-.17 = (U0.D7-);
    NOS-.0 = (U0.B-);
    NOS-.1 = (U0.C-);
    U1.Q-.3 = (U0.D2-);
    U1.Q-.16 = (M-0.16);
    U1.Q-.15 = (M-0.15);
    U1.Q-.14 = (M-0.14);
    U1.Q-.13 = (M-0.13);
    U1.Q-.12 = (M-0.12);
    U1.Q-.11 = (M-0.11);
    U1.Q-.10 = (M-0.10);
    U1.Q-.9 = (M-0.9);
    U1.Q-.8 = (M-0.8);
    U1.Q-.7 = (M-0.7);
    U1.Q-.6 = (M-0.6);
    U1.Q-.5 = (M-0.5);
    U1.Q-.4 = (M-0.4);
    U1.Q-.3 = (M-0.3);
    U1.Q-.2 = (M-0.2);
    U1.Q-.1 = (M-0.1);
    U1.Q-.0 = (M-0.0);
    U1.D-.17 = (M-0.16);
    U1.D-.16 = (M-0.15);
    U1.D-.15 = (M-0.14);
    U1.D-.14 = (M-0.13);
    U1.D-.13 = (M-0.12);
    U1.D-.12 = (M-0.11);
    U1.D-.11 = (M-0.10);
    U1.D-.10 = (M-0.9);
    U1.D-.9 = (M-0.8);
    U1.D-.8 = (M-0.7);
    U1.D-.7 = (M-0.6);
    U1.D-.6 = (M-0.5);
    U1.D-.5 = (M-0.4);
    U1.D-.4 = (M-0.3);
    U1.D-.3 = (M-0.2);
    U1.D-.2 = (M-0.1);
    U1.D-.1 = (M-0.0);
    U1.D-.0 = (D-);

  /* type converters *********************/

ANNOTATIONS
{
  BUS BUS_TYPE = "DOT";
}

END MODULE;

/* * * * * * *  Contents of NET file D3.NET  * * * * * * * */

/*******************************************************/
```

```
/*  Netlist copyright (C) 1989 LSI Logic Corporation  */
/*******************************************************/


MODULE D3;

INPUTS      CP,D.2,D.1,D.0,HOLD,RESET_;
OUTPUTS     Q.2,Q.1,Q.0;

LEVEL FUNCTION;
DEFINE
  /* implicit connectors *******************/

    Q-.2 = (Q.2);
    Q-.1 = (Q.1);
    Q-.0 = (Q.0);
    CP- = (CP);
    D-.2 = (D.2);
    D-.1 = (D.1);
    D-.0 = (D.0);
    RESET_- = (RESET_);
    HOLD- = (HOLD);


  /* part instances ***************************/

    U0.2(Q-.2=Q) = FD2SA(Q-.2=TI,CP-=CP,HOLD-=TE,D-.2=D,RESET_-=CD);
    U0.1(Q-.1=Q) = FD2SA(Q-.1=TI,CP-=CP,HOLD-=TE,D-.1=D,RESET_-=CD);
    U0.0(Q-.0=Q) = FD2SA(Q-.0=TI,CP-=CP,HOLD-=TE,D-.0=D,RESET_-=CD);


  /* extractors ******************************/


  /* type converters *********************/

ANNOTATIONS
{
  BUS BUS_TYPE = "DOT";
}

END MODULE;


/* * * * * * *  Contents of NET file SFIFO8X4.NET  * * * * * * */

/*******************************************************/
/*  Netlist copyright (C) 1989 LSI Logic Corporation  */
/*******************************************************/


MODULE SFIFO8X4;

INPUTS      CP,DI.2,DI.1,DI.0,POP,PUSH,RESET_,WAIT;
OUTPUTS     DO.2,DO.1,DO.0;

LEVEL FUNCTION;
DEFINE
  /* implicit connectors *******************/

    POP- = (POP);
    BRESET_- = (BRESET_);
    CP- = (CP);
    DO-.2 = (DO.2);
    DO-.1 = (DO.1);
    DO-.0 = (DO.0);
    DI-.2 = (DI.2);
    DI-.1 = (DI.1);
    DI-.0 = (DI.0);
    BRESET_- = (BRESET_);
    RESET_- = (RESET_);
    BRESET_- = (BRESET_);
    BRESET_- = (BRESET_);
```

```
CP- = (CP);
PUSH- = (PUSH);
WAIT- = (WAIT);
WAIT- = (WAIT);
CP- = (CP);


/* part instances **************************/

U7.2(DO-.2=Z) = MUX81HB(U7.A-.0=A,U7.B-.0=B,U7.C-.0=C,U7.D0-.2=D0,
        U7.D1-.2=D1,U7.D2-.2=D2,U7.D3-.2=D3,U7.D4-.2=D4,
        U7.D5-.2=D5,U7.D6-.2=D6,U7.D7-.2=D7);
U7.1(DO-.1=Z) = MUX81HB(U7.A-.0=A,U7.B-.0=B,U7.C-.0=C,U7.D0-.1=D0,
        U7.D1-.1=D1,U7.D2-.1=D2,U7.D3-.1=D3,U7.D4-.1=D4,
        U7.D5-.1=D5,U7.D6-.1=D6,U7.D7-.1=D7);
U7.0(DO-.0=Z) = MUX81HB(U7.A-.0=A,U7.B-.0=B,U7.C-.0=C,U7.D0-.0=D0,
        U7.D1-.0=D1,U7.D2-.0=D2,U7.D3-.0=D3,U7.D4-.0=D4,
        U7.D5-.0=D5,U7.D6-.0=D6,U7.D7-.0=D7);
U3.7(U3.Q-.7.2=Q.2,U3.Q-.7.1=Q.1,U3.Q-.7.0=Q.0) = D3(BRESET_-=RESET_,
        U0.ZN-.7=HOLD,CP-=CP,DI-.2=D.2,DI-.1=D.1,DI-.0=D.0);
U3.6(U3.Q-.6.2=Q.2,U3.Q-.6.1=Q.1,U3.Q-.6.0=Q.0) = D3(BRESET_-=RESET_,
        U0.ZN-.6=HOLD,CP-=CP,DI-.2=D.2,DI-.1=D.1,DI-.0=D.0);
U3.5(U3.Q-.5.2=Q.2,U3.Q-.5.1=Q.1,U3.Q-.5.0=Q.0) = D3(BRESET_-=RESET_,
        U0.ZN-.5=HOLD,CP-=CP,DI-.2=D.2,DI-.1=D.1,DI-.0=D.0);
U3.4(U3.Q-.4.2=Q.2,U3.Q-.4.1=Q.1,U3.Q-.4.0=Q.0) = D3(BRESET_-=RESET_,
        U0.ZN-.4=HOLD,CP-=CP,DI-.2=D.2,DI-.1=D.1,DI-.0=D.0);
U3.3(U3.Q-.3.2=Q.2,U3.Q-.3.1=Q.1,U3.Q-.3.0=Q.0) = D3(BRESET_-=RESET_,
        U0.ZN-.3=HOLD,CP-=CP,DI-.2=D.2,DI-.1=D.1,DI-.0=D.0);
U3.2(U3.Q-.2.2=Q.2,U3.Q-.2.1=Q.1,U3.Q-.2.0=Q.0) = D3(BRESET_-=RESET_,
        U0.ZN-.2=HOLD,CP-=CP,DI-.2=D.2,DI-.1=D.1,DI-.0=D.0);
U3.1(U3.Q-.1.2=Q.2,U3.Q-.1.1=Q.1,U3.Q-.1.0=Q.0) = D3(BRESET_-=RESET_,
        U0.ZN-.1=HOLD,CP-=CP,DI-.2=D.2,DI-.1=D.1,DI-.0=D.0);
U3.0(U3.Q-.0.2=Q.2,U3.Q-.0.1=Q.1,U3.Q-.0.0=Q.0) = D3(BRESET_-=RESET_,
        U0.ZN-.0=HOLD,CP-=CP,DI-.2=D.2,DI-.1=D.1,DI-.0=D.0);
U8(BRESET_-=Z) = B3A(RESET_-=A);
U1(U1.Z-=Z) = AND2B(PUSH-=A,U4.Z-=B);
U2(U2.Q-.2=Q.2,U2.Q-.1=Q.1,U2.Q-.0=Q.0) = CNT3(BRESET_-=RESET_,
        CP-=CP,U1.Z-=CE);
U0(U0.ZN-.7=ZN.7,U0.ZN-.6=ZN.6,U0.ZN-.5=ZN.5,U0.ZN-.4=ZN.4,
        U0.ZN-.3=ZN.3,U0.ZN-.2=ZN.2,U0.ZN-.1=ZN.1,U0.ZN-.0=ZN.0)
         = DEC3X8(U2.Q-.2=A.2,U2.Q-.1=A.1,U2.Q-.0=A.0,WAIT-=GN);
U4(U4.Z-=Z) = N1B(WAIT-=A);
U5(U5.Z-=Z) = AND2B(POP-=B,U4.Z-=A);
U6(U6.Q-.2=Q.2,U6.Q-.1=Q.1,U6.Q-.0=Q.0) = CNT3(CP-=CP,BRESET_-=RESET_,
        U5.Z-=CE);


/* extractors ******************************/

U6.Q-.1 = (U7.B-.0);
U6.Q-.0 = (U7.A-.0);
U6.Q-.2 = (U7.C-.0);
U3.Q-.0.2 = (U7.D0-.2);
U3.Q-.0.1 = (U7.D0-.1);
U3.Q-.0.0 = (U7.D0-.0);
U3.Q-.1.2 = (U7.D1-.2);
U3.Q-.1.1 = (U7.D1-.1);
U3.Q-.1.0 = (U7.D1-.0);
U3.Q-.3.2 = (U7.D3-.2);
U3.Q-.3.1 = (U7.D3-.1);
U3.Q-.3.0 = (U7.D3-.0);
U3.Q-.4.2 = (U7.D4-.2);
U3.Q-.4.1 = (U7.D4-.1);
U3.Q-.4.0 = (U7.D4-.0);
U3.Q-.5.2 = (U7.D5-.2);
U3.Q-.5.1 = (U7.D5-.1);
U3.Q-.5.0 = (U7.D5-.0);
U3.Q-.6.2 = (U7.D6-.2);
U3.Q-.6.1 = (U7.D6-.1);
U3.Q-.6.0 = (U7.D6-.0);
U3.Q-.7.2 = (U7.D7-.2);
U3.Q-.7.1 = (U7.D7-.1);
U3.Q-.7.0 = (U7.D7-.0);
U3.Q-.2.2 = (U7.D2-.2);
```

```
    U3.Q-.2.1 = (U7.D2-.1);
    U3.Q-.2.0 = (U7.D2-.0);


  /* type converters ********************/

ANNOTATIONS
{
  BUS BUS_TYPE = "DOT";
}

END MODULE;



/* * * * * * *  Contents of NET file DEC3X8.NET  * * * * * * */

/*****************************************************/
/*  Netlist copyright (C) 1989 LSI Logic Corporation  */
/*****************************************************/


MODULE DEC3X8;

INPUTS      A.2,A.1,A.0,GN;
OUTPUTS     ZN.7,ZN.6,ZN.5,ZN.4,ZN.3,ZN.2,ZN.1,ZN.0;

LEVEL FUNCTION;
DEFINE
  /* implicit connectors ******************/

    A-.2 = (A.2);
    A-.1 = (A.1);
    A-.0 = (A.0);
    ZN-.7 = (ZN.7);
    ZN-.6 = (ZN.6);
    ZN-.5 = (ZN.5);
    ZN-.4 = (ZN.4);
    ZN-.3 = (ZN.3);
    ZN-.2 = (ZN.2);
    ZN-.1 = (ZN.1);
    ZN-.0 = (ZN.0);
    GN- = (GN);

/* part instances *************************/

  M___12(M___12.Z-=Z) = ND4B(M___12.B-=B,M___12.A-=A,M___4.Z-=D,
          M___12.C-=C);
  M___5(M___5.Z-=Z) = ND4B(M___3.Z-=A,M___2.Z-=B,M___4.Z-=D,
          M___1.Z-=C);
  M___1(M___1.Z-=Z) = N1B(M___1.A-=A);
  M___7(M___7.Z-=Z) = ND4B(M___3.Z-=A,M___7.B-=B,M___4.Z-=D,
          M___1.Z-=C);
  M___11(M___11.Z-=Z) = ND4B(M___11.B-=B,M___11.A-=A,M___4.Z-=D,
          M___1.Z-=C);
  M___9(M___9.Z-=Z) = ND4B(M___9.A-=A,M___2.Z-=B,M___4.Z-=D,
          M___1.Z-=C);
  M___2(M___2.Z-=Z) = N1B(M___2.A-=A);
  M___10(M___10.Z-=Z) = ND4B(M___10.A-=A,M___2.Z-=B,M___4.Z-=D,
          M___10.C-=C);
  M___6(M___6.Z-=Z) = ND4B(M___3.Z-=A,M___2.Z-=B,M___4.Z-=D,
          M___6.C-=C);
  M___3(M___3.Z-=Z) = N1B(M___3.A-=A);
  M___8(M___8.Z-=Z) = ND4B(M___3.Z-=A,M___8.B-=B,M___4.Z-=D,
          M___8.C-=C);
  M___4(M___4.Z-=Z) = N1D(GN-=A);


/* extractors ****************************/

  ZN-.3 = (M___8.Z-);
  A-.1 = (M___12.B-);
  A-.2 = (M___12.A-);
  A-.0 = (M___12.C-);
```

```
    ZN-.7 = (M___12.Z-);
    A-.2 = (M___10.A-);
    A-.2 = (M___9.A-);
    ZN-.4 = (M___9.Z-);
    ZN-.0 = (M___5.Z-);
    A-.0 = (M___1.A-);
    A-.1 = (M___7.B-);
    ZN-.2 = (M___7.Z-);
    A-.1 = (M___11.B-);
    A-.2 = (M___11.A-);
    ZN-.6 = (M___11.Z-);
    A-.1 = (M___2.A-);
    A-.0 = (M___10.C-);
    ZN-.5 = (M___10.Z-);
    ZN-.1 = (M___6.Z-);
    A-.0 = (M___6.C-);
    A-.2 = (M___3.A-);
    A-.1 = (M___8.B-);
    A-.0 = (M___8.C-);

  /* type converters *********************/

ANNOTATIONS
{
  BUS BUS_TYPE = "DOT";
}

END MODULE;

/* * * * * * *  Contents of NET file CNT3.NET  * * * * * * */

/*******************************************************/
/*  Netlist copyright (C) 1989 LSI Logic Corporation  */
/*******************************************************/


MODULE CNT3;

INPUTS      CE,CP,RESET_;
OUTPUTS     Q.2,Q.1,Q.0;

LEVEL FUNCTION;
DEFINE
  /* implicit connectors *******************/

    RESET_- = (RESET_);
    Q-.2 = (Q.2);
    Q-.1 = (Q.1);
    Q-.0 = (Q.0);
    CE- = (CE);
    CP- = (CP);


  /* part instances *************************/

    U5(U5.Z-=Z) = B3A(RESET_-=A);
    U3(U3.Q-=Q) = FJK2A(CP-=CP,CE-=J,CE-=K,U5.Z-=CD);
    U1(U1.Q-=Q) = FJK2A(CP-=CP,U5.Z-=CD,U2.Z-=K,U2.Z-=J);
    U2(U2.Z-=Z) = AND3C(CE-=B,U0.Q-=C,U3.Q-=A);
    U4(U4.Z-=Z) = AND2B(U3.Q-=B,CE-=A);
    U0(U0.Q-=Q) = FJK2A(CP-=CP,U5.Z-=CD,U4.Z-=J,U4.Z-=K);


  /* extractors *****************************/

    Q-.1 = (U0.Q-);
    Q-.0 = (U3.Q-);
    Q-.2 = (U1.Q-);


  /* type converters *********************/

ANNOTATIONS
{
```

```
  BUS BUS_TYPE = "DOT";
}

END MODULE;


/* * * * * * *  Contents of NET file CMAGV2.NET  * * * * * * */

/*******************************************************/
/*  Netlist copyright (C) 1989 LSI Logic Corporation  */
/*******************************************************/


MODULE CMAGV2;

INPUTS       CMAGEN,CP,DLY_POL,ENXAU,EOC,INT_GT_1IN,NOS.1,NOS.0,
             PXL_EN,RESET_,SPRCYC,S_MODE,WAIT,XCOF_ADR.2,
             XCOF_ADR.1,XCOF_ADR.0,XGT1,YCOF_ADR.2,YCOF_ADR.1,
             YCOF_ADR.0,YCOF_SEL;
OUTPUTS      COF_ADR.3,COF_ADR.2,COF_ADR.1,COF_ADR.0;

LEVEL FUNCTION;
DEFINE
  /* implicit connectors *******************/

    PXL_EN- = (PXL_EN);
    S_MODE- = (S_MODE);
    INT_GT_1IN- = (INT_GT_1IN);
    CMAGEN- = (CMAGEN);
    RESET_- = (RESET_);
    EOC- = (EOC);
    XCOF_ADR-.2 = (XCOF_ADR.2);
    XCOF_ADR-.1 = (XCOF_ADR.1);
    XCOF_ADR-.0 = (XCOF_ADR.0);
    CLEAR_- = (CLEAR_);
    CP- = (CP);
    CLEAR_- = (CLEAR_);
    YCOF_SEL- = (YCOF_SEL);
    YCOF_SEL- = (YCOF_SEL);
    WAIT- = (WAIT);
    CP- = (CP);
    DLY_POL- = (DLY_POL);
    DLY_POL- = (DLY_POL);
    NOS-.1 = (NOS.1);
    NOS-.0 = (NOS.0);
    NOS-.1 = (NOS.1);
    NOS-.0 = (NOS.0);
    SPRCYC- = (SPRCYC);
    SPRCYC- = (SPRCYC);
    WAIT- = (WAIT);
    WAIT- = (WAIT);
    WAIT- = (WAIT);
    WAIT- = (WAIT);
    YCOF_ADR-.2 = (YCOF_ADR.2);
    YCOF_ADR-.1 = (YCOF_ADR.1);
    YCOF_ADR-.0 = (YCOF_ADR.0);
    COF_ADR-.3 = (COF_ADR.3);
    COF_ADR-.2 = (COF_ADR.2);
    COF_ADR-.1 = (COF_ADR.1);
    COF_ADR-.0 = (COF_ADR.0);
    CP- = (CP);
    CP- = (CP);
    CLEAR_- = (CLEAR_);
    CLEAR_- = (CLEAR_);
    ENXAU- = (ENXAU);
    ENXAU- = (ENXAU);
    XGT1- = (XGT1);


  /* part instances **************************/

   U12(U12.Z-=Z) = ND3B(PXL_EN-=A,S_MODE-=C,INT_GT_1IN-=B);
   U10(U10.Z-=Z) = N1A(RESET_-=A);
```

```
    U11(CLEAR_-=Z) = NR2B(U10.Z-=B,EOC-=A);
    U1(U1.Z-=Z) = N1A(SPRCYC-=A);
    U2(U2.QD-=QD) = SRDLY(CLEAR_-=RESET_,CP-=CP,WAIT-=WAIT,DLY_POL-=DLY_POL,
            NOS-.1=NOS.1,NOS-.0=NOS.0,SPRCYC-=D);
    U13.3(U13.Z-.3=Z) = MX21LB(WAIT-=S,COF_ADR-.3=B,U13.A-.3=A);
    U13.2(U13.Z-.2=Z) = MX21LB(WAIT-=S,COF_ADR-.2=B,U13.A-.2=A);
    U13.1(U13.Z-.1=Z) = MX21LB(WAIT-=S,COF_ADR-.1=B,U13.A-.1=A);
    U13.0(U13.Z-.0=Z) = MX21LB(WAIT-=S,COF_ADR-.0=B,U13.A-.0=A);
    U14.3(U14.Z-.3=Z) = MX21LB(WAIT-=S,COF_ADR-.3=B,U14.A-.3=A);
    U14.2(U14.Z-.2=Z) = MX21LB(WAIT-=S,COF_ADR-.2=B,U14.A-.2=A);
    U14.1(U14.Z-.1=Z) = MX21LB(WAIT-=S,COF_ADR-.1=B,U14.A-.1=A);
    U14.0(U14.Z-.0=Z) = MX21LB(WAIT-=S,COF_ADR-.0=B,U14.A-.0=A);
    U7.3(COF_ADR-.3=QN) = FD4SA(CLEAR_-=SD,U14.Z-.3=D,U13.Z-.3=TI,
            YCOF_SEL-=TE,CP-=CP);
    U7.2(COF_ADR-.2=QN) = FD4SA(CLEAR_-=SD,U14.Z-.2=D,U13.Z-.2=TI,
            YCOF_SEL-=TE,CP-=CP);
    U7.1(COF_ADR-.1=QN) = FD4SA(CLEAR_-=SD,U14.Z-.1=D,U13.Z-.1=TI,
            YCOF_SEL-=TE,CP-=CP);
    U7.0(COF_ADR-.0=QN) = FD4SA(CLEAR_-=SD,U14.Z-.0=D,U13.Z-.0=TI,
            YCOF_SEL-=TE,CP-=CP);
    U5(U5.QD-=QD) = ADLY(CLEAR_-=RESET_,U4.Z-=D,NOS-.1=NOS.1,NOS-.0=NOS.0,
            DLY_POL-=DLY_POL,WAIT-=WAIT,CP-=CP);
    U4(U4.Z-=Z) = OR2B(U2.QD-=A,U9.QN-=B);
    U8(U8.Z-=Z) = NR3B(YCOF_SEL-=B,U5.QD-=A,U9.QN-=C);
    U6(U6.DO-.2=DO.2,U6.DO-.1=DO.1,U6.DO-.0=DO.0) = SFIFO8X4(
            XCOF_ADR-.2=DI.2,XCOF_ADR-.1=DI.1,XCOF_ADR-.0=DI.0,
            U3.Z-=PUSH,WAIT-=WAIT,CP-=CP,CLEAR_-=RESET_,U8.Z-=POP);
    U9(U9.QN-=QN) = FD2A(CMAGEN-=CP,CLEAR_-=CD,ENXAU-=D);
    U3(U3.Z-=Z) = AND4C(U12.Z-=D,U1.Z-=C,U0.Z-=B,ENXAU-=A);
    U0(U0.Z-=Z) = N1A(XGT1-=A);

  /* extractors ****************************/

    U13.A-.3 = (YCOF_SEL-);
    U13.A-.2 = (YCOF_ADR-.2);
    U13.A-.1 = (YCOF_ADR-.1);
    U13.A-.0 = (YCOF_ADR-.0);
    U14.A-.2 = (U6.DO-.2);
    U14.A-.1 = (U6.DO-.1);
    U14.A-.0 = (U6.DO-.0);
    U14.A-.3 = (YCOF_SEL-);

  /* type converters ********************/

ANNOTATIONS
{
  BUS BUS_TYPE = "DOT";
}

END MODULE;


/* * * * * * *  Contents of NET file ADD16F1.NET  * * * * * * */

/*****************************************************/
/*  Netlist copyright (C) 1989 LSI Logic Corporation  */
/*****************************************************/


MODULE ADD16F1;

INPUTS      A.15,A.14,A.13,A.12,A.11,A.10,A.9,A.8,A.7,A.6,A.5,A.4,
            A.3,A.2,A.1,A.0,B.15,B.14,B.13,B.12,B.11,B.10,B.9,B.8,
            B.7,B.6,B.5,B.4,B.3,B.2,B.1,B.0;
OUTPUTS     S.16,S.15,S.14,S.13,S.12,S.11,S.10,S.9,S.8,S.7,S.6,
            S.5,S.4,S.3,S.2,S.1,S.0;

LEVEL FUNCTION;
DEFINE
  /* implicit connectors ******************/
```

```
S-.16 = (S.16);
S-.15 = (S.15);
S-.14 = (S.14);
S-.13 = (S.13);
S-.12 = (S.12);
S-.11 = (S.11);
S-.10 = (S.10);
S-.9 = (S.9);
S-.8 = (S.8);
S-.7 = (S.7);
S-.6 = (S.6);
S-.5 = (S.5);
S-.4 = (S.4);
S-.3 = (S.3);
S-.2 = (S.2);
S-.1 = (S.1);
S-.0 = (S.0);
A-.15 = (A.15);
A-.14 = (A.14);
A-.13 = (A.13);
A-.12 = (A.12);
A-.11 = (A.11);
A-.10 = (A.10);
A-.9 = (A.9);
A-.8 = (A.8);
A-.7 = (A.7);
A-.6 = (A.6);
A-.5 = (A.5);
A-.4 = (A.4);
A-.3 = (A.3);
A-.2 = (A.2);
A-.1 = (A.1);
A-.0 = (A.0);
B-.15 = (B.15);
B-.14 = (B.14);
B-.13 = (B.13);
B-.12 = (B.12);
B-.11 = (B.11);
B-.10 = (B.10);
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);


/* part instances ***************************/

U17(U17.Z-=Z) = ND2B(U6.Z-=A,U7.P-=B);
U13(U13.Z-=Z) = N1C(U16.G-=A);
U14(U14.Z-=Z) = N1B(U15.Z-=A);
U15(U15.Z-=Z) = ND2C(U12.Z-=A,U13.Z-=B);
U12(U12.Z-=Z) = ND2C(U16.P-=B,U7.G-=A);
U8(U8.Z-=Z) = AND2B(U7.P-=A,U16.P-=B);
U9(U9.Z-=Z) = ND2B(U6.Z-=A,U8.Z-=B);
U10(U10.Z-=Z) = ND2C(U14.Z-=B,U9.Z-=A);
U1(U1.Z-=Z) = EOC(U0.Z-=B,U10.Z-=A);
U0(U0.Z-=Z) = EOA(U0.B-=B,U0.A-=A);
U5(U5.SUM0-=SUM0,U5.SUM1-=SUM1,U5.SUM2-=SUM2,U5.SUM3-=SUM3,
        U5.G-=G) = ADD23F0_SEL4(U5.B3-=B3,U5.B2-=B2,U5.B1-=B1,
        U5.B0-=B0,U5.A3-=A3,U5.A2-=A2,U5.A1-=A1,U5.A0-=A0);
U2(U2.Z-=Z) = ND2C(U5.G-=A,U4.P-=B);
U4(U4.SUM3-=SUM3,U4.P-=P,U4.G-=G,U4.SUM0-=SUM0,U4.SUM2-=SUM2,
        U4.SUM1-=SUM1) = ADD23F_SEL4(U4.A3-=A3,U4.A2-=A2,U4.A1-=A1,
        U4.A0-=A0,U4.B0-=B0,U4.B3-=B3,U4.B2-=B2,U4.B1-=B1,
        U5.G-=CI);
U3(U3.Z-=Z) = N1C(U4.G-=A);
U6(U6.Z-=Z) = ND2C(U2.Z-=A,U3.Z-=B);
U7(U7.P-=P,U7.G-=G,U7.SUM0-=SUM0,U7.SUM3-=SUM3,U7.SUM2-=SUM2,
```

```
        U7.SUM1-=SUM1) = ADD23F_SEL4(U7.A3-=A3,U7.A2-=A2,U7.A1-=A1,
        U7.A0-=A0,U7.B0-=B0,U7.B2-=B2,U7.B1-=B1,U7.B3-=B3,
        U6.Z-=CI);
 U18(U18.Z-=Z) = N1A(U7.G-=A);
 U19(U19.Z-=Z) = ND2B(U17.Z-=A,U18.Z-=B);
 U16(U16.P-=P,U16.G-=G,U16.SUM0-=SUM0,U16.SUM3-=SUM3,U16.SUM2-=SUM2,
        U16.SUM1-=SUM1) = ADD23F_SEL4(U16.B0-=B0,U16.B1-=B1,
        U16.B2-=B2,U0.B-=B3,U16.A2-=A2,U0.A-=A3,U16.A1-=A1,
        U16.A0-=A0,U19.Z-=CI);


/* extractors ******************************/

 B-.12 = (U16.B0-);
 B-.13 = (U16.B1-);
 B-.14 = (U16.B2-);
 B-.8 = (U7.B0-);
 B-.10 = (U7.B2-);
 B-.9 = (U7.B1-);
 B-.11 = (U7.B3-);
 B-.4 = (U4.B0-);
 B-.7 = (U4.B3-);
 B-.6 = (U4.B2-);
 B-.5 = (U4.B1-);
 B-.3 = (U5.B3-);
 B-.2 = (U5.B2-);
 B-.1 = (U5.B1-);
 B-.0 = (U5.B0-);
 A-.1 = (U5.A1-);
 A-.12 = (U16.A0-);
 A-.6 = (U4.A2-);
 A-.13 = (U16.A1-);
 A-.8 = (U7.A0-);
 A-.2 = (U5.A2-);
 A-.4 = (U4.A0-);
 M-0.5 = (U4.SUM1-);
 M-0.6 = (U4.SUM2-);
 M-0.7 = (U4.SUM3-);
 M-0.15 = (U16.SUM3-);
 M-0.3 = (U5.SUM3-);
 M-0.9 = (U7.SUM1-);
 M-0.10 = (U7.SUM2-);
 M-0.2 = (U5.SUM2-);
 M-0.11 = (U7.SUM3-);
 M-0.13 = (U16.SUM1-);
 M-0.12 = (U16.SUM0-);
 M-0.1 = (U5.SUM1-);
 M-0.4 = (U4.SUM0-);
 M-0.8 = (U7.SUM0-);
 M-0.0 = (U5.SUM0-);
 M-0.14 = (U16.SUM2-);
 S-.15 = (M-0.15);
 S-.14 = (M-0.14);
 S-.13 = (M-0.13);
 S-.12 = (M-0.12);
 S-.11 = (M-0.11);
 S-.10 = (M-0.10);
 S-.9 = (M-0.9);
 S-.8 = (M-0.8);
 S-.7 = (M-0.7);
 S-.6 = (M-0.6);
 S-.5 = (M-0.5);
 S-.4 = (M-0.4);
 S-.3 = (M-0.3);
 S-.2 = (M-0.2);
 S-.1 = (M-0.1);
 S-.0 = (M-0.0);
 S-.16 = (U1.Z-);
 A-.15 = (U0.A-);
 A-.11 = (U7.A3-);
 A-.5 = (U4.A1-);
 A-.10 = (U7.A2-);
 A-.9 = (U7.A1-);
 A-.7 = (U4.A3-);
```

```
    A-.3 = (U5.A3-);
    A-.14 = (U16.A2-);
    A-.0 = (U5.A0-);
    B-.15 = (U0.B-);


  /* type converters *********************/

 ANNOTATIONS
 {
  BUS BUS_TYPE = "DOT";
 }

 END MODULE;



/* * * * * * *  Contents of NET file ADDF_SEL2.NET  * * * * * * */

/******************************************************/
/*  Netlist copyright (C) 1989 LSI Logic Corporation  */
/******************************************************/


MODULE ADDF_SEL2;

INPUTS      A0,A1,B0,B1,CI;
OUTPUTS     G,P,SUM0,SUM1;

LEVEL FUNCTION;
DEFINE
  /* implicit connectors *******************/

    A0- = (A0);
    B0- = (B0);
    P- = (P);
    A1- = (A1);
    SUM1- = (SUM1);
    CI- = (CI);
    SUM0- = (SUM0);
    B1- = (B1);
    G- = (G);

  /* part instances **************************/

    U1(U1.Z-=Z) = ND2A(B0-=B,A0-=A);
    U0(U0.Z-=Z) = NR2B(A0-=A,B0-=B);
    U9(U9.Z-=Z) = ENB(U7.Z-=B,U1.Z-=A);
    U12(U12.Z-=Z) = N1D(CI-=A);
    U11(U11.Z-=Z) = N1C(U3.Z-=A);
    U10(SUM0-=Z) = MX21LB(U11.Z-=A,U3.Z-=B,U12.Z-=S);
    U15(SUM1-=Z) = MX21LB(U8.Z-=A,U9.Z-=B,U12.Z-=S);
    U8(U8.Z-=Z) = EOB(U2.Z-=B,U7.Z-=A);
    U6(U6.Z-=Z) = N1C(U5.Z-=A);
    U7(U7.Z-=Z) = ND2C(U4.Z-=A,U6.Z-=B);
    U4(U4.Z-=Z) = ND2C(A1-=A,B1-=B);
    U5(U5.Z-=Z) = NR2B(A1-=A,B1-=B);
    U14(P-=Z) = NR2C(U5.Z-=B,U0.Z-=A);
    U2(U2.Z-=Z) = N1B(U0.Z-=A);
    U3(U3.Z-=Z) = ND2C(U1.Z-=A,U2.Z-=B);
    U13(G-=Z) = AO7C(U4.Z-=C,U5.Z-=B,U1.Z-=A);


  /* extractors *****************************/


  /* type converters *********************/

ANNOTATIONS
{
  BUS BUS_TYPE = "DOT";
}

END MODULE;
```

```
/* * * * * * *  Contents of NET file ADDF_SEL1.NET  * * * * * * */

/*******************************************************/
/*  Netlist copyright (C) 1989 LSI Logic Corporation  */
/*******************************************************/


MODULE ADDF_SEL1;

INPUTS      A0,B0,CI;
OUTPUTS     G,P,SUM0;

LEVEL FUNCTION;
DEFINE
  /* implicit connectors *******************/

    B0- = (B0);
    G- = (G);
    SUM0- = (SUM0);
    CI- = (CI);
    P- = (P);
    A0- = (A0);


  /* part instances ***************************/

    U6(G-=Z) = N1C(U1.Z-=A);
    U2(U2.Z-=Z) = N1C(U0.Z-=A);
    U7(U7.Z-=Z) = N1D(CI-=A);
    U3(SUM0-=Z) = MX21LB(U2.Z-=A,U0.Z-=B,U7.Z-=S);
    U0(U0.Z-=Z) = ND2C(U1.Z-=A,P-=B);
    U4(P-=Z) = N1C(U5.Z-=A);
    U5(U5.Z-=Z) = NR2B(A0-=A,B0-=B);
    U1(U1.Z-=Z) = ND2C(B0-=B,A0-=A);


  /* extractors ******************************/


  /* type converters *********************/

ANNOTATIONS
{
  BUS BUS_TYPE = "DOT";
}

END MODULE;


/* * * * * * *  Contents of NET file ADD18F1.NET  * * * * * * */

/*******************************************************/
/*  Netlist copyright (C) 1989 LSI Logic Corporation  */
/*******************************************************/


MODULE ADD18F1;

INPUTS      A.17,A.16,A.15,A.14,A.13,A.12,A.11,A.10,A.9,A.8,A.7,
            A.6,A.5,A.4,A.3,A.2,A.1,A.0,B.17,B.16,B.15,B.14,B.13,
            B.12,B.11,B.10,B.9,B.8,B.7,B.6,B.5,B.4,B.3,B.2,B.1,
            B.0;
OUTPUTS     S.18,S.17,S.16,S.15,S.14,S.13,S.12,S.11,S.10,S.9,S.8,
            S.7,S.6,S.5,S.4,S.3,S.2,S.1,S.0;

LEVEL FUNCTION;
DEFINE
  /* implicit connectors *******************/

    S-.18 = (S.18);
    S-.17 = (S.17);
    S-.16 = (S.16);
```

```
S-.15 = (S.15);
S-.14 = (S.14);
S-.13 = (S.13);
S-.12 = (S.12);
S-.11 = (S.11);
S-.10 = (S.10);
S-.9 = (S.9);
S-.8 = (S.8);
S-.7 = (S.7);
S-.6 = (S.6);
S-.5 = (S.5);
S-.4 = (S.4);
S-.3 = (S.3);
S-.2 = (S.2);
S-.1 = (S.1);
S-.0 = (S.0);
A-.17 = (A.17);
A-.16 = (A.16);
A-.15 = (A.15);
A-.14 = (A.14);
A-.13 = (A.13);
A-.12 = (A.12);
A-.11 = (A.11);
A-.10 = (A.10);
A-.9 = (A.9);
A-.8 = (A.8);
A-.7 = (A.7);
A-.6 = (A.6);
A-.5 = (A.5);
A-.4 = (A.4);
A-.3 = (A.3);
A-.2 = (A.2);
A-.1 = (A.1);
A-.0 = (A.0);
B-.17 = (B.17);
B-.16 = (B.16);
B-.15 = (B.15);
B-.14 = (B.14);
B-.13 = (B.13);
B-.12 = (B.12);
B-.11 = (B.11);
B-.10 = (B.10);
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);


/* part instances **************************/

U13(U13.Z-=Z) = N1C(U16.G-=A);
U1(U1.Z-=Z) = AO6C(U10.Z-=A,U11.P-=B,U11.G-=C);
U20(U20.Z-.0=Z) = EOC(U1.Z-=A,U0.Z-=B);
U3(U3.Z-=Z) = N1C(U4.G-=A);
U6(U6.Z-=Z) = ND2C(U3.Z-=B,U2.Z-=A);
U2(U2.Z-=Z) = ND2C(U4.P-=B,U5.G-=A);
U5(U5.SUM0-=SUM0,U5.SUM1-=SUM1,U5.SUM2-=SUM2,U5.SUM3-=SUM3,
        U5.G-=G) = ADD23F0_SEL4(U5.B3-=B3,U5.B2-=B2,U5.B1-=B1,
        U5.B0-=B0,U5.A3-=A3,U5.A2-=A2,U5.A1-=A1,U5.A0-=A0);
U4(U4.SUM3-=SUM3,U4.P-=P,U4.G-=G,U4.SUM0-=SUM0,U4.SUM2-=SUM2,
        U4.SUM1-=SUM1) = ADDF_SEL4(U4.A3-=A3,U4.A2-=A2,U4.A1-=A1,
        U4.A0-=A0,U4.B0-=B0,U4.B3-=B3,U4.B2-=B2,U4.B1-=B1,
        U5.G-=CI);
U0(U0.Z-=Z) = ENA(U11.B1-=B,U11.A1-=A);
U11(U11.SUM1-=SUM1,U11.SUM0-=SUM0,U11.P-=P,U11.G-=G) =
        ADDF_SEL2(U10.Z-=CI,U11.A0-=A0,U11.A1-=A1,U11.B1-=B1,
        U11.B0-=B0);
U16(U16.P-=P,U16.G-=G,U16.SUM0-=SUM0,U16.SUM3-=SUM3,U16.SUM2-=SUM2,
```

```
        U16.SUM1-=SUM1) = ADDF_SEL4(U16.A3-=A3,U16.A2-=A2,
        U16.A1-=A1,U16.A0-=A0,U16.B0-=B0,U16.B3-=B3,U16.B2-=B2,
        U16.B1-=B1,U19.Z-=CI);
  U18(U18.Z-=Z) = N1A(U7.G-=A);
  U19(U19.Z-=Z) = ND2B(U18.Z-=B,U17.Z-=A);
  U17(U17.Z-=Z) = ND2B(U7.P-=B,U6.Z-=A);
  U8(U8.Z-=Z) = AND2B(U16.P-=B,U7.P-=A);
  U12(U12.Z-=Z) = ND2C(U7.G-=A,U16.P-=B);
  U14(U14.Z-=Z) = ND2C(U13.Z-=B,U12.Z-=A);
  U15(U15.Z-=Z) = N1B(U14.Z-=A);
  U10(U10.Z-=Z) = ND2B(U15.Z-=B,U9.Z-=A);
  U9(U9.Z-=Z) = ND2B(U8.Z-=B,U6.Z-=A);
  U7(U7.P-=P,U7.G-=G,U7.SUM0-=SUM0,U7.SUM3-=SUM3,U7.SUM2-=SUM2,
        U7.SUM1-=SUM1) = ADDF_SEL4(U7.A3-=A3,U7.A2-=A2,U7.A1-=A1,
        U7.A0-=A0,U7.B0-=B0,U7.B2-=B2,U7.B1-=B1,U7.B3-=B3,
        U6.Z-=CI);


/* extractors ******************************/

  B-.8 = (U7.B0-);
  B-.9 = (U7.B1-);
  B-.11 = (U7.B3-);
  B-.12 = (U16.B0-);
  B-.15 = (U16.B3-);
  B-.14 = (U16.B2-);
  B-.13 = (U16.B1-);
  M-0.9 = (U7.SUM1-);
  M-0.15 = (U16.SUM3-);
  M-0.8 = (U7.SUM0-);
  M-0.10 = (U7.SUM2-);
  M-0.14 = (U16.SUM2-);
  M-0.11 = (U7.SUM3-);
  M-0.12 = (U16.SUM0-);
  M-0.16 = (U11.SUM0-);
  S-.17 = (M-0.17);
  S-.16 = (M-0.16);
  S-.15 = (M-0.15);
  S-.14 = (M-0.14);
  S-.13 = (M-0.13);
  S-.12 = (M-0.12);
  S-.11 = (M-0.11);
  S-.10 = (M-0.10);
  S-.9 = (M-0.9);
  S-.8 = (M-0.8);
  S-.7 = (M-0.7);
  S-.6 = (M-0.6);
  S-.5 = (M-0.5);
  S-.4 = (M-0.4);
  S-.3 = (M-0.3);
  S-.2 = (M-0.2);
  S-.1 = (M-0.1);
  S-.0 = (M-0.0);
  S-.18 = (U20.Z-.0);
  A-.15 = (U16.A3-);
  A-.10 = (U7.A2-);
  A-.12 = (U16.A0-);
  A-.13 = (U16.A1-);
  A-.11 = (U7.A3-);
  A-.9 = (U7.A1-);
  A-.14 = (U16.A2-);
  A-.16 = (U11.A0-);
  A-.8 = (U7.A0-);
  M-0.7 = (U4.SUM3-);
  A-.6 = (U4.A2-);
  A-.5 = (U4.A1-);
  A-.4 = (U4.A0-);
  B-.4 = (U4.B0-);
  M-0.4 = (U4.SUM0-);
  B-.7 = (U4.B3-);
  B-.6 = (U4.B2-);
  B-.5 = (U4.B1-);
  M-0.6 = (U4.SUM2-);
  M-0.5 = (U4.SUM1-);
  M-0.0 = (U5.SUM0-);
```

```
    M-0.1 = (U5.SUM1-);
    M-0.2 = (U5.SUM2-);
    M-0.3 = (U5.SUM3-);
    B-.3 = (U5.B3-);
    B-.2 = (U5.B2-);
    B-.1 = (U5.B1-);
    B-.0 = (U5.B0-);
    A-.3 = (U5.A3-);
    A-.2 = (U5.A2-);
    A-.1 = (U5.A1-);
    A-.0 = (U5.A0-);
    A-.7 = (U4.A3-);
    A-.17 = (U11.A1-);
    B-.17 = (U11.B1-);
    B-.16 = (U11.B0-);
    M-0.17 = (U11.SUM1-);
    M-0.13 = (U16.SUM1-);
    B-.10 = (U7.B2-);

  /* type converters *********************/

ANNOTATIONS
{
  BUS BUS_TYPE = "DOT";
}

END MODULE;



/* * * * * * *  Contents of NET file ADDF0_SEL4.NET  * * * * * * */

/*******************************************************/
/*  Netlist copyright (C) 1989 LSI Logic Corporation   */
/*******************************************************/


MODULE ADDF0_SEL4;

INPUTS      A0,A1,A2,A3,B0,B1,B2,B3;
OUTPUTS     G,SUM0,SUM1,SUM2,SUM3;

LEVEL FUNCTION;
DEFINE
  /* implicit connectors ******************/

    SUM0- = (SUM0);
    B1- = (B1);
    A1- = (A1);
    B2- = (B2);
    A2- = (A2);
    B3- = (B3);
    A3- = (A3);
    G- = (G);
    SUM3- = (SUM3);
    SUM2- = (SUM2);
    SUM1- = (SUM1);
    A0- = (A0);
    B0- = (B0);

  /* part instances *************************/

    U23(SUM0-=Z) = N1C(U5.Z-=A);
    U1(U1.Z-=Z) = N1B(U8.Z-=A);
    U5(U5.Z-=Z) = ND2B(U1.Z-=B,U13.Z-=A);
    U16(U16.Z-=Z) = ND2C(B1-=B,A1-=A);
    U6(U6.Z-=Z) = NR2C(B1-=B,A1-=A);
    U2(U2.Z-=Z) = N1B(U6.Z-=A);
    U10(U10.Z-=Z) = ND2C(B2-=B,A2-=A);
    U9(U9.Z-=Z) = NR2C(B2-=B,A2-=A);
    U14(U14.Z-=Z) = N1B(U12.Z-=A);
    U15(U15.Z-=Z) = ND2C(B3-=B,A3-=A);
    U12(U12.Z-=Z) = NR2C(B3-=B,A3-=A);
```

```
U26(U26.Z-=Z) = N1C(U4.Z-=A);
U25(G-=Z) = ND2C(U24.Z-=A,U26.Z-=B);
U24(U24.Z-=Z) = ND2B(U18.Z-=B,U3.Z-=A);
U3(U3.Z-=Z) = NR2C(U9.Z-=A,U12.Z-=B);
U7(U7.Z-=Z) = N1B(U9.Z-=A);
U20(U20.Z-=Z) = EOB(U10.Z-=A,U17.Z-=B);
U30(SUM3-=Z) = N1C(U31.Z-=A);
U31(U31.Z-=Z) = MX21LA(U18.Z-=S,U21.Z-=B,U20.Z-=A);
U21(U21.Z-=Z) = ENB(U17.Z-=A,U7.Z-=B);
U17(U17.Z-=Z) = ND2C(U14.Z-=B,U15.Z-=A);
U4(U4.Z-=Z) = AO7A(U12.Z-=B,U10.Z-=A,U15.Z-=C);
U11(U11.Z-=Z) = ND2B(U7.Z-=B,U10.Z-=A);
U19(U19.Z-=Z) = N1B(U11.Z-=A);
U27(SUM2-=Z) = N1C(U22.Z-=A);
U22(U22.Z-=Z) = MX21LA(U18.Z-=S,U19.Z-=A,U11.Z-=B);
U18(U18.Z-=Z) = AO7B(U13.Z-=A,U6.Z-=B,U16.Z-=C);
U0(U0.Z-=Z) = ND2B(U2.Z-=B,U16.Z-=A);
U28(SUM1-=Z) = N1C(U29.Z-=A);
U29(U29.Z-=Z) = ENB(U13.Z-=A,U0.Z-=B);
U13(U13.Z-=Z) = ND2C(B0-=B,A0-=A);
U8(U8.Z-=Z) = NR2C(B0-=B,A0-=A);


/* extractors ******************************/


/* type converters *********************/

ANNOTATIONS
{
  BUS BUS_TYPE = "DOT";
}

END MODULE;


/* * * * * * *  Contents of NET file ADDF_SEL4.NET  * * * * * * */

/*******************************************************/
/*  Netlist copyright (C) 1989 LSI Logic Corporation  */
/*******************************************************/


MODULE ADDF_SEL4;

INPUTS       A0,A1,A2,A3,B0,B1,B2,B3,CI;
OUTPUTS      G,P,SUM0,SUM1,SUM2,SUM3;
LEVEL FUNCTION;
DEFINE
  /* implicit connectors *******************/

    CI- = (CI);
    SUM0- = (SUM0);
    A0- = (A0);
    P- = (P);
    A2- = (A2);
    B2- = (B2);
    G- = (G);
    A3- = (A3);
    B3- = (B3);
    SUM3- = (SUM3);
    SUM2- = (SUM2);
    SUM1- = (SUM1);
    B1- = (B1);
    A1- = (A1);
    B0- = (B0);


  /* part instances **************************/

    U14(U14.Z-=Z) = N1D(CI-=A);
    U13(U13.Z-=Z) = N1C(U11.Z-=A);
```

```
    U10(U10.Z-=Z) = EOB(U12.Z-=A,U3.Z-=B);
    U21(U21.Z-=Z) = NR2C(B0-=B,A0-=A);
    U3(U3.Z-=Z) = N1B(U21.Z-=A);
    U11(U11.Z-=Z) = ND2B(U3.Z-=B,U25.Z-=A);
    U15(SUM0-=Z) = MX21LB(U13.Z-=A,U14.Z-=S,U11.Z-=B);
    U39(P-=Z) = AND2B(U6.Z-=B,U2.Z-=A);
    U23(U23.Z-=Z) = NR2C(B2-=B,A2-=A);
    U22(U22.Z-=Z) = ND2C(A2-=A,B2-=B);
    U7(G-=Z) = ND2C(U8.Z-=B,U5.Z-=A);
    U8(U8.Z-=Z) = N1C(U9.Z-=A);
    U32(U32.Z-=Z) = ND2C(U28.Z-=A,U31.Z-=B);
    U31(U31.Z-=Z) = N1B(U30.Z-=A);
    U30(U30.Z-=Z) = NR2C(B3-=B,A3-=A);
    U28(U28.Z-=Z) = ND2C(A3-=A,B3-=B);
    U9(U9.Z-=Z) = AO7A(U30.Z-=B,U22.Z-=A,U28.Z-=C);
    U26(U26.Z-=Z) = ND2B(U24.Z-=B,U22.Z-=A);
    U20(U20.Z-=Z) = N1B(U26.Z-=A);
    U36(U36.Z-=Z) = MX21LA(U27.Z-=S,U20.Z-=A,U26.Z-=B);
    U5(U5.Z-=Z) = ND2B(U27.Z-=B,U6.Z-=A);
    U6(U6.Z-=Z) = NR2C(U23.Z-=A,U30.Z-=B);
    U24(U24.Z-=Z) = N1B(U23.Z-=A);
    U33(U33.Z-=Z) = ENB(U32.Z-=A,U24.Z-=B);
    U34(U34.Z-=Z) = EOB(U22.Z-=A,U32.Z-=B);
    U38(U38.Z-=Z) = MX21LA(U27.Z-=S,U33.Z-=B,U34.Z-=A);
    U40(SUM3-=Z) = MX21LB(U37.Z-=A,U38.Z-=B,U14.Z-=S);
    U37(U37.Z-=Z) = MX21LA(U33.Z-=B,U34.Z-=A,U18.Z-=S);
    U19(U19.Z-=Z) = MX21LA(U20.Z-=A,U26.Z-=B,U18.Z-=S);
    U35(SUM2-=Z) = MX21LB(U36.Z-=B,U19.Z-=A,U14.Z-=S);
    U16(SUM1-=Z) = MX21LB(U17.Z-=B,U10.Z-=A,U14.Z-=S);
    U17(U17.Z-=Z) = ENB(U25.Z-=A,U12.Z-=B);
    U12(U12.Z-=Z) = ND2B(U4.Z-=B,U29.Z-=A);
    U4(U4.Z-=Z) = N1B(U0.Z-=A);
    U29(U29.Z-=Z) = ND2C(A1-=A,B1-=B);
    U0(U0.Z-=Z) = NR2C(B1-=B,A1-=A);
    U2(U2.Z-=Z) = NR2C(U21.Z-=B,U0.Z-=A);
    U1(U1.Z-=Z) = N1C(U2.Z-=A);
    U18(U18.Z-=Z) = ND2C(U29.Z-=A,U1.Z-=B);
    U27(U27.Z-=Z) = AO7B(U25.Z-=A,U0.Z-=B,U29.Z-=C);
    U25(U25.Z-=Z) = ND2C(A0-=A,B0-=B);

  /* extractors ******************************/


  /* type converters *********************/

ANNOTATIONS
{
  BUS BUS_TYPE = "DOT";
}

END MODULE;


/* * * * * * *  Contents of NET file ADD17F1.NET  * * * * * * */

/*****************************************************/
/*  Netlist copyright (C) 1989 LSI Logic Corporation  */
/*****************************************************/


MODULE ADD17F1;

INPUTS      A.16,A.15,A.14,A.13,A.12,A.11,A.10,A.9,A.8,A.7,A.6,
            A.5,A.4,A.3,A.2,A.1,A.0,B.16,B.15,B.14,B.13,B.12,B.11,
            B.10,B.9,B.8,B.7,B.6,B.5,B.4,B.3,B.2,B.1,B.0;
OUTPUTS     S.17,S.16,S.15,S.14,S.13,S.12,S.11,S.10,S.9,S.8,S.7,
            S.6,S.5,S.4,S.3,S.2,S.1,S.0;

LEVEL FUNCTION;
DEFINE
  /* implicit connectors *******************/
```

```
  S-.17 = (S.17);
  S-.16 = (S.16);
  S-.15 = (S.15);
  S-.14 = (S.14);
  S-.13 = (S.13);
  S-.12 = (S.12);
  S-.11 = (S.11);
  S-.10 = (S.10);
  S-.9 = (S.9);
  S-.8 = (S.8);
  S-.7 = (S.7);
  S-.6 = (S.6);
  S-.5 = (S.5);
  S-.4 = (S.4);
  S-.3 = (S.3);
  S-.2 = (S.2);
  S-.1 = (S.1);
  S-.0 = (S.0);
  A-.16 = (A.16);
  A-.15 = (A.15);
  A-.14 = (A.14);
  A-.13 = (A.13);
  A-.12 = (A.12);
  A-.11 = (A.11);
  A-.10 = (A.10);
  A-.9 = (A.9);
  A-.8 = (A.8);
  A-.7 = (A.7);
  A-.6 = (A.6);
  A-.5 = (A.5);
  A-.4 = (A.4);
  A-.3 = (A.3);
  A-.2 = (A.2);
  A-.1 = (A.1);
  A-.0 = (A.0);
  B-.16 = (B.16);
  B-.15 = (B.15);
  B-.14 = (B.14);
  B-.13 = (B.13);
  B-.12 = (B.12);
  B-.11 = (B.11);
  B-.10 = (B.10);
  B-.9 = (B.9);
  B-.8 = (B.8);
  B-.7 = (B.7);
  B-.6 = (B.6);
  B-.5 = (B.5);
  B-.4 = (B.4);
  B-.3 = (B.3);
  B-.2 = (B.2);
  B-.1 = (B.1);
  B-.0 = (B.0);


/* part instances **************************/

  U13(U13.Z-=Z) = N1C(U12.G-=A);
  U10(U10.Z-=Z) = ND2C(U12.P-=B,U11.G-=A);
  U9(U9.Z-=Z) = ND2C(U13.Z-=B,U10.Z-=A);
  U17(U17.Z-=Z) = N1B(U1.Z-=A);
  U0(U0.P-=P,U0.G-=G,U0.SUM0-=SUM0,U0.SUM3-=SUM3,U0.SUM2-=SUM2,
          U0.SUM1-=SUM1) = ADDF_SEL4(U0.A3-=A3,U0.A2-=A2,U0.A1-=A1,
          U0.A0-=A0,U0.B0-=B0,U0.B3-=B3,U0.B2-=B2,U0.B1-=B1,
          U5.Z-=CI);
  U4(U4.Z-=Z) = N1C(U0.G-=A);
  U1(U1.Z-=Z) = ND2C(U4.Z-=B,U2.Z-=A);
  U2(U2.Z-=Z) = ND2C(U8.G-=A,U0.P-=B);
  U3(U3.Z-=Z) = AND2B(U8.P-=A,U0.P-=B);
  U6(U6.Z-=Z) = ND2B(U8.P-=B,U9.Z-=A);
  U5(U5.Z-=Z) = ND2B(U7.Z-=B,U6.Z-=A);
  U7(U7.Z-=Z) = N1A(U8.G-=A);
  U8(U8.P-=P,U8.G-=G,U8.SUM0-=SUM0,U8.SUM3-=SUM3,U8.SUM2-=SUM2,
          U8.SUM1-=SUM1) = ADDF_SEL4(U8.A3-=A3,U8.A2-=A2,U8.A1-=A1,
          U8.A0-=A0,U8.B0-=B0,U8.B2-=B2,U8.B1-=B1,U8.B3-=B3,
          U9.Z-=CI);
```

```
U15(U15.Z-=Z) = ND2B(U3.Z-=B,U9.Z-=A);
U16(U16.Z-=Z) = ND2B(U17.Z-=B,U15.Z-=A);
U18(U18.Z-=Z) = AO6B(U14.G-=C,U14.P-=B,U16.Z-=A);
U20(U20.Z-=Z) = EOC(U19.Z-=B,U18.Z-=A);
U19(U19.Z-=Z) = ENA(U14.B0-=B,U14.A0-=A);
U14(U14.G-=G,U14.P-=P,U14.SUM0-=SUM0) = ADDF_SEL1(U16.Z-=CI,
        U14.A0-=A0,U14.B0-=B0);
U12(U12.SUM3-=SUM3,U12.P-=P,U12.G-=G,U12.SUM0-=SUM0,U12.SUM2-=SUM2,
        U12.SUM1-=SUM1) = ADDF_SEL4(U12.A3-=A3,U12.A2-=A2,
        U12.A1-=A1,U12.A0-=A0,U12.B0-=B0,U12.B3-=B3,U12.B2-=B2,
        U12.B1-=B1,U11.G-=CI);
U11(U11.SUM0-=SUM0,U11.SUM1-=SUM1,U11.SUM2-=SUM2,U11.SUM3-=SUM3,
        U11.G-=G) = ADDF0_SEL4(U11.B3-=B3,U11.B2-=B2,U11.B1-=B1,
        U11.B0-=B0,U11.A3-=A3,U11.A2-=A2,U11.A1-=A1,U11.A0-=A0);


/* extractors ******************************/

  B-.3 = (U11.B3-);
  B-.1 = (U11.B1-);
  B-.0 = (U11.B0-);
  B-.4 = (U12.B0-);
  B-.7 = (U12.B3-);
  B-.6 = (U12.B2-);
  B-.5 = (U12.B1-);
  M-0.0 = (U11.SUM0-);
  M-0.6 = (U12.SUM2-);
  M-0.3 = (U11.SUM3-);
  M-0.1 = (U11.SUM1-);
  M-0.4 = (U12.SUM0-);
  M-0.2 = (U11.SUM2-);
  M-0.7 = (U12.SUM3-);
  S-.16 = (M-0.16);
  S-.15 = (M-0.15);
  S-.14 = (M-0.14);
  S-.13 = (M-0.13);
  S-.12 = (M-0.12);
  S-.11 = (M-0.11);
  S-.10 = (M-0.10);
  S-.9 = (M-0.9);
  S-.8 = (M-0.8);
  S-.7 = (M-0.7);
  S-.6 = (M-0.6);
  S-.5 = (M-0.5);
  S-.4 = (M-0.4);
  S-.3 = (M-0.3);
  S-.2 = (M-0.2);
  S-.1 = (M-0.1);
  S-.0 = (M-0.0);
  S-.17 = (U20.Z-);
  A-.10 = (U8.A2-);
  A-.5 = (U12.A1-);
  A-.4 = (U12.A0-);
  A-.6 = (U12.A2-);
  A-.8 = (U8.A0-);
  A-.11 = (U8.A3-);
  A-.2 = (U11.A2-);
  A-.3 = (U11.A3-);
  A-.9 = (U8.A1-);
  A-.15 = (U0.A3-);
  A-.13 = (U0.A1-);
  A-.7 = (U12.A3-);
  A-.1 = (U11.A1-);
  A-.0 = (U11.A0-);
  A-.16 = (U14.A0-);
  A-.14 = (U0.A2-);
  A-.12 = (U0.A0-);
  B-.12 = (U0.B0-);
  M-0.12 = (U0.SUM0-);
  B-.15 = (U0.B3-);
  B-.14 = (U0.B2-);
  B-.13 = (U0.B1-);
  M-0.15 = (U0.SUM3-);
  M-0.14 = (U0.SUM2-);
```

```
    M-0.13 = (U0.SUM1-);
    B-.8 = (U8.B0-);
    M-0.8 = (U8.SUM0-);
    B-.10 = (U8.B2-);
    B-.9 = (U8.B1-);
    B-.11 = (U8.B3-);
    M-0.11 = (U8.SUM3-);
    M-0.10 = (U8.SUM2-);
    M-0.9 = (U8.SUM1-);
    B-.16 = (U14.B0-);
    M-0.16 = (U14.SUM0-);
    M-0.5 = (U12.SUM1-);
    B-.2 = (U11.B2-);


  /* type converters *********************/

ANNOTATIONS
{
  BUS BUS_TYPE = "DOT";
}

END MODULE;


/* * * * * * *  Contents of NET file ENGN_V3.NET  * * * * * * */

/******************************************************/
/*  Netlist copyright (C) 1989 LSI Logic Corporation  */
/******************************************************/


MODULE ENGN_V3;

INPUTS      CD0.11,CD0.10,CD0.9,CD0.8,CD0.7,CD0.6,CD0.5,CD0.4,
            CD0.3,CD0.2,CD0.1,CD0.0,CD1.11,CD1.10,CD1.9,CD1.8,
            CD1.7,CD1.6,CD1.5,CD1.4,CD1.3,CD1.2,CD1.1,CD1.0,
            CD2.11,CD2.10,CD2.9,CD2.8,CD2.7,CD2.6,CD2.5,CD2.4,
            CD2.3,CD2.2,CD2.1,CD2.0,CD3.11,CD3.10,CD3.9,CD3.8,
            CD3.7,CD3.6,CD3.5,CD3.4,CD3.3,CD3.2,CD3.1,CD3.0,
            CD4.11,CD4.10,CD4.9,CD4.8,CD4.7,CD4.6,CD4.5,CD4.4,
            CD4.3,CD4.2,CD4.1,CD4.0,CP,DLY_POL,DUP,FRST_ROW,
            LST_ROW,LST_ROW_1,NOS.1,NOS.0,PDI.12,PDI.11,PDI.10,
            PDI.9,PDI.8,PDI.7,PDI.6,PDI.5,PDI.4,PDI.3,PDI.2,PDI.1,
            PDI.0,PLR_CS_,RC0.7,RC0.6,RC0.5,RC0.4,RC0.3,RC0.2,
            RC0.1,RC0.0,RC1.7,RC1.6,RC1.5,RC1.4,RC1.3,RC1.2,RC1.1,
            RC1.0,RC2.7,RC2.6,RC2.5,RC2.4,RC2.3,RC2.2,RC2.1,RC2.0,
            RC3.7,RC3.6,RC3.5,RC3.4,RC3.3,RC3.2,RC3.1,RC3.0,RC4.7,
            RC4.6,RC4.5,RC4.4,RC4.3,RC4.2,RC4.1,RC4.0,RESET_,
            ROW_ORDR.2,ROW_ORDR.1,ROW_ORDR.0,S,SCND_ROW,SE,SEL10,
            SEL11,SPR.1,SPR.0,STB_I,S_MODE,TST,WAIT,WR_;
OUTPUTS     CNVL.12,CNVL.11,CNVL.10,CNVL.9,CNVL.8,CNVL.7,CNVL.6,
            CNVL.5,CNVL.4,CNVL.3,CNVL.2,CNVL.1,CNVL.0,PDO2.15,
            PDO2.14,PDO2.13,PDO2.12,PDO2.11,PDO2.10,PDO2.9,PDO2.8,
            PDO2.7,PDO2.6,PDO2.5,PDO2.4,PDO2.3,PDO2.2,PDO2.1,
            PDO2.0;

LEVEL FUNCTION;
DEFINE
  /* implicit connectors *******************/

    LST_ROW- = (LST_ROW);
    LST_ROW_1- = (LST_ROW_1);
    SCND_ROW- = (SCND_ROW);
    FRST_ROW- = (FRST_ROW);
    ROW_ORDR-.2 = (ROW_ORDR.2);
    ROW_ORDR-.1 = (ROW_ORDR.1);
    ROW_ORDR-.0 = (ROW_ORDR.0);
    STB_I- = (STB_I);
    S- = (S);
    BS- = (BS);
    CD1-.11 = (CD1.11);
    CD1-.10 = (CD1.10);
    CD1-.9 = (CD1.9);
```

```
CD1-.8 = (CD1.8);
CD1-.7 = (CD1.7);
CD1-.6 = (CD1.6);
CD1-.5 = (CD1.5);
CD1-.4 = (CD1.4);
CD1-.3 = (CD1.3);
CD1-.2 = (CD1.2);
CD1-.1 = (CD1.1);
CD1-.0 = (CD1.0);
U29.TCYN- = (NC/0/);
U17.TCYN- = (NC/0/);
CD3-.11 = (CD3.11);
CD3-.10 = (CD3.10);
CD3-.9 = (CD3.9);
CD3-.8 = (CD3.8);
CD3-.7 = (CD3.7);
CD3-.6 = (CD3.6);
CD3-.5 = (CD3.5);
CD3-.4 = (CD3.4);
CD3-.3 = (CD3.3);
CD3-.2 = (CD3.2);
CD3-.1 = (CD3.1);
CD3-.0 = (CD3.0);
BWAIT0- = (BWAIT0);
WAIT- = (WAIT);
BWAIT2- = (BWAIT2);
CP- = (CP);
CP- = (CP);
CP- = (CP);
CP- = (CP);
BWAIT0- = (BWAIT0);
CP- = (CP);
U30.TCYN- = (NC/0/);
U16.TCYN- = (NC/0/);
CD4-.11 = (CD4.11);
CD4-.10 = (CD4.10);
CD4-.9 = (CD4.9);
CD4-.8 = (CD4.8);
CD4-.7 = (CD4.7);
CD4-.6 = (CD4.6);
CD4-.5 = (CD4.5);
CD4-.4 = (CD4.4);
CD4-.3 = (CD4.3);
CD4-.2 = (CD4.2);
CD4-.1 = (CD4.1);
CD4-.0 = (CD4.0);
CP- = (CP);
BRESET0_- = (BRESET0_);
BWAIT4- = (BWAIT4);
BWAIT4- = (BWAIT4);
CP- = (CP);
BRESET0_- = (BRESET0_);
BWAIT3- = (BWAIT3);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
CP- = (CP);
BRESET3_- = (BRESET3_);
BRESET3_- = (BRESET3_);
BRESET2_- = (BRESET2_);
BWAIT2- = (BWAIT2);
CP- = (CP);
SEL11- = (SEL11);
SEL10- = (SEL10);
CP- = (CP);
```

```
BWAIT2- = (BWAIT2);
BRESET2_- = (BRESET2_);
U28.TCYN- = (NC/0/);
CD2-.11 = (CD2.11);
CD2-.10 = (CD2.10);
CD2-.9 = (CD2.9);
CD2-.8 = (CD2.8);
CD2-.7 = (CD2.7);
CD2-.6 = (CD2.6);
CD2-.5 = (CD2.5);
CD2-.4 = (CD2.4);
CD2-.3 = (CD2.3);
CD2-.2 = (CD2.2);
CD2-.1 = (CD2.1);
CD2-.0 = (CD2.0);
BRESET2_- = (BRESET2_);
BWAIT0- = (BWAIT0);
CP- = (CP);
BWAIT4- = (BWAIT4);
DLY_POL- = (DLY_POL);
DLY_POL- = (DLY_POL);
NOS-.1 = (NOS.1);
NOS-.0 = (NOS.0);
NOS-.1 = (NOS.1);
NOS-.0 = (NOS.0);
BRESET2_- = (BRESET2_);
CP- = (CP);
SE- = (SE);
DUP- = (DUP);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PLR_CS_- = (PLR_CS_);
WR_- = (WR_);
TST- = (TST);
SPR-.1 = (SPR.1);
SPR-.0 = (SPR.0);
BS- = (BS);
BS- = (BS);
BS- = (BS);
U28.RND- = (NC/0/);
BRESET3_- = (BRESET3_);
BWAIT1- = (BWAIT1);
CP- = (CP);
CP- = (CP);
BWAIT1- = (BWAIT1);
BWAIT1- = (BWAIT1);
BWAIT1- = (BWAIT1);
BWAIT1- = (BWAIT1);
CP- = (CP);
BRESET1_- = (BRESET1_);
BRESET1_- = (BRESET1_);
BRESET1_- = (BRESET1_);
RESET_- = (RESET_);
BRESET0_- = (BRESET0_);
BRESET1_- = (BRESET1_);
BRESET1_- = (BRESET1_);
M-0 = (NC/0/);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
```

```
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
BRESET2_- = (BRESET2_);
BRESET2_- = (BRESET2_);
BRESET3_- = (BRESET3_);
BRESET3_- = (BRESET3_);
BRESET3_- = (BRESET3_);
BWAIT3- = (BWAIT3);
BWAIT3- = (BWAIT3);
CP- = (CP);
BWAIT4- = (BWAIT4);
BWAIT4- = (BWAIT4);
U16.RND- = (NC/0/);
U17.TCX- = (NC/1/);
CD0-.11 = (CD0.11);
CD0-.10 = (CD0.10);
CD0-.9 = (CD0.9);
CD0-.8 = (CD0.8);
CD0-.7 = (CD0.7);
CD0-.6 = (CD0.6);
CD0-.5 = (CD0.5);
CD0-.4 = (CD0.4);
CD0-.3 = (CD0.3);
CD0-.2 = (CD0.2);
CD0-.1 = (CD0.1);
CD0-.0 = (CD0.0);
U30.RND- = (NC/0/);
BRESET0_- = (BRESET0_);
BRESET0_- = (BRESET0_);
CP- = (CP);
CP- = (CP);
BWAIT2- = (BWAIT2);
BWAIT2- = (BWAIT2);
BWAIT0- = (BWAIT0);
BWAIT0- = (BWAIT0);
U17.RND- = (NC/0/);
U29.RND- = (NC/0/);
BS- = (BS);
BS- = (BS);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);
RC2-.7 = (RC2.7);
RC2-.6 = (RC2.6);
RC2-.5 = (RC2.5);
RC2-.4 = (RC2.4);
RC2-.3 = (RC2.3);
RC2-.2 = (RC2.2);
RC2-.1 = (RC2.1);
RC2-.0 = (RC2.0);
RC1-.7 = (RC1.7);
RC1-.6 = (RC1.6);
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
```

```
RC0-.2 = (RC0.2);
RC0-.1 = (RC0.1);
RC0-.0 = (RC0.0);
S_MODE- = (S_MODE);
RC4-.7 = (RC4.7);
RC4-.6 = (RC4.6);
RC4-.5 = (RC4.5);
RC4-.4 = (RC4.4);
RC4-.3 = (RC4.3);
RC4-.2 = (RC4.2);
RC4-.1 = (RC4.1);
RC4-.0 = (RC4.0);


/* part instances *************************/

U9(BS-=Z) = B3A(S-=A);
U10.4(U10.Z-.4=Z) = B3A(WAIT-=A);
U10.3(U10.Z-.3=Z) = B3A(WAIT-=A);
U10.2(U10.Z-.2=Z) = B3A(WAIT-=A);
U10.1(U10.Z-.1=Z) = B3A(WAIT-=A);
U10.0(U10.Z-.0=Z) = B3A(WAIT-=A);
U18(U18.S-.18=S.18,U18.S-.17=S.17,U18.S-.16=S.16,U18.S-.15=S.15,
        U18.S-.14=S.14,U18.S-.13=S.13,U18.S-.12=S.12,
        U18.S-.11=S.11,U18.S-.10=S.10,U18.S-.9=S.9,U18.S-.8=S.8,
        U18.S-.7=S.7,U18.S-.6=S.6,U18.S-.5=S.5,U18.S-.4=S.4,
        U18.S-.3=S.3,U18.S-.2=S.2,U18.S-.1=S.1,U18.S-.0=S.0)
         = ADD18F1(U21.Q-.17=A.17,U21.Q-.16=A.16,U21.Q-.15=A.15,
        U21.Q-.14=A.14,U21.Q-.13=A.13,U21.Q-.12=A.12,
        U21.Q-.11=A.11,U21.Q-.10=A.10,U21.Q-.9=A.9,U21.Q-.8=A.8,
        U21.Q-.7=A.7,U21.Q-.6=A.6,U21.Q-.5=A.5,U21.Q-.4=A.4,
        U21.Q-.3=A.3,U21.Q-.2=A.2,U21.Q-.1=A.1,U21.Q-.0=A.0,
        U18.B-.17=B.17,U18.B-.16=B.16,U18.B-.15=B.15,
        U18.B-.14=B.14,U18.B-.13=B.13,U18.B-.12=B.12,
        U18.B-.11=B.11,U18.B-.10=B.10,U18.B-.9=B.9,U18.B-.8=B.8,
        U18.B-.7=B.7,U18.B-.6=B.6,U18.B-.5=B.5,U18.B-.4=B.4,
        U18.B-.3=B.3,U18.B-.2=B.2,U18.B-.1=B.1,U18.B-.0=B.0);
U26(U26.S-.16=S.16,U26.S-.15=S.15,U26.S-.14=S.14,U26.S-.13=S.13,
        U26.S-.12=S.12,U26.S-.11=S.11,U26.S-.10=S.10,U26.S-.9=S.9,
        U26.S-.8=S.8,U26.S-.7=S.7,U26.S-.6=S.6,U26.S-.5=S.5,
        U26.S-.4=S.4,U26.S-.3=S.3,U26.S-.2=S.2,U26.S-.1=S.1,
        U26.S-.0=S.0) = ADD16F1(U25.Q-.15=B.15,U25.Q-.14=B.14,
        U25.Q-.13=B.13,U25.Q-.12=B.12,U25.Q-.11=B.11,
        U25.Q-.10=B.10,U25.Q-.9=B.9,U25.Q-.8=B.8,U25.Q-.7=B.7,
        U25.Q-.6=B.6,U25.Q-.5=B.5,U25.Q-.4=B.4,U25.Q-.3=B.3,
        U25.Q-.2=B.2,U25.Q-.1=B.1,U25.Q-.0=B.0,U27.Q-.15=A.15,
        U27.Q-.14=A.14,U27.Q-.13=A.13,U27.Q-.12=A.12,
        U27.Q-.11=A.11,U27.Q-.10=A.10,U27.Q-.9=A.9,U27.Q-.8=A.8,
        U27.Q-.7=A.7,U27.Q-.6=A.6,U27.Q-.5=A.5,U27.Q-.4=A.4,
        U27.Q-.3=A.3,U27.Q-.2=A.2,U27.Q-.1=A.1,U27.Q-.0=A.0);
U37(U37.Z-.12=Z.12,U37.Z-.11=Z.11,U37.Z-.10=Z.10,U37.Z-.9=Z.9,
        U37.Z-.8=Z.8,U37.Z-.7=Z.7,U37.Z-.6=Z.6,U37.Z-.5=Z.5,
        U37.Z-.4=Z.4,U37.Z-.3=Z.3,U37.Z-.2=Z.2,U37.Z-.1=Z.1,
        U37.Z-.0=Z.0) = MUX2X1W13X8(U36.Q0-.12=D0.12,U36.Q0-.11=D0.11,
        U36.Q0-.10=D0.10,U36.Q0-.9=D0.9,U36.Q0-.8=D0.8,
        U36.Q0-.7=D0.7,U36.Q0-.6=D0.6,U36.Q0-.5=D0.5,
        U36.Q0-.4=D0.4,U36.Q0-.3=D0.3,U36.Q0-.2=D0.2,
        U36.Q0-.1=D0.1,U36.Q0-.0=D0.0,BS-=S,U31.D4-.7=D1.7,
        U31.D4-.6=D1.6,U31.D4-.5=D1.5,U31.D4-.4=D1.4,
        U31.D4-.3=D1.3,U31.D4-.2=D1.2,U31.D4-.1=D1.1,
        U31.D4-.0=D1.0);
U35(U35.Z-.12=Z.12,U35.Z-.11=Z.11,U35.Z-.10=Z.10,U35.Z-.9=Z.9,
        U35.Z-.8=Z.8,U35.Z-.7=Z.7,U35.Z-.6=Z.6,U35.Z-.5=Z.5,
        U35.Z-.4=Z.4,U35.Z-.3=Z.3,U35.Z-.2=Z.2,U35.Z-.1=Z.1,
        U35.Z-.0=Z.0) = MUX2X1W13X8(U36.Q4-.12=D0.12,U36.Q4-.11=D0.11,
        U36.Q4-.10=D0.10,U36.Q4-.9=D0.9,U36.Q4-.8=D0.8,
        U36.Q4-.7=D0.7,U36.Q4-.6=D0.6,U36.Q4-.5=D0.5,
        U36.Q4-.4=D0.4,U36.Q4-.3=D0.3,U36.Q4-.2=D0.2,
        U36.Q4-.1=D0.1,U36.Q4-.0=D0.0,BS-=S,U31.D0-.7=D1.7,
        U31.D0-.6=D1.6,U31.D0-.5=D1.5,U31.D0-.4=D1.4,
        U31.D0-.3=D1.3,U31.D0-.2=D1.2,U31.D0-.1=D1.1,
        U31.D0-.0=D1.0);
U36(U36.Q0-.12=Q0.12,U36.Q0-.11=Q0.11,U36.Q0-.10=Q0.10,
        U36.Q0-.9=Q0.9,U36.Q0-.8=Q0.8,U36.Q0-.7=Q0.7,
        U36.Q0-.6=Q0.6,U36.Q0-.5=Q0.5,U36.Q0-.4=Q0.4,
```

```
        U36.Q0-.3=Q0.3,U36.Q0-.2=Q0.2,U36.Q0-.1=Q0.1,
        U36.Q0-.0=Q0.0,U36.Q1-.12=Q1.12,U36.Q1-.11=Q1.11,
        U36.Q1-.10=Q1.10,U36.Q1-.9=Q1.9,U36.Q1-.8=Q1.8,
        U36.Q1-.7=Q1.7,U36.Q1-.6=Q1.6,U36.Q1-.5=Q1.5,
        U36.Q1-.4=Q1.4,U36.Q1-.3=Q1.3,U36.Q1-.2=Q1.2,
        U36.Q1-.1=Q1.1,U36.Q1-.0=Q1.0,U36.Q2-.12=Q2.12,
        U36.Q2-.11=Q2.11,U36.Q2-.10=Q2.10,U36.Q2-.9=Q2.9,
        U36.Q2-.8=Q2.8,U36.Q2-.7=Q2.7,U36.Q2-.6=Q2.6,
        U36.Q2-.5=Q2.5,U36.Q2-.4=Q2.4,U36.Q2-.3=Q2.3,
        U36.Q2-.2=Q2.2,U36.Q2-.1=Q2.1,U36.Q2-.0=Q2.0,
        U36.Q3-.12=Q3.12,U36.Q3-.11=Q3.11,U36.Q3-.10=Q3.10,
        U36.Q3-.9=Q3.9,U36.Q3-.8=Q3.8,U36.Q3-.7=Q3.7,
        U36.Q3-.6=Q3.6,U36.Q3-.5=Q3.5,U36.Q3-.4=Q3.4,
        U36.Q3-.3=Q3.3,U36.Q3-.2=Q3.2,U36.Q3-.1=Q3.1,
        U36.Q3-.0=Q3.0,U36.Q4-.12=Q4.12,U36.Q4-.11=Q4.11,
        U36.Q4-.10=Q4.10,U36.Q4-.9=Q4.9,U36.Q4-.8=Q4.8,
        U36.Q4-.7=Q4.7,U36.Q4-.6=Q4.6,U36.Q4-.5=Q4.5,
        U36.Q4-.4=Q4.4,U36.Q4-.3=Q4.3,U36.Q4-.2=Q4.2,
        U36.Q4-.1=Q4.1,U36.Q4-.0=Q4.0) = PLREGV2(BWAIT4-=WAIT,
        DLY_POL-=DLY_POL,NOS-.1=NOS.1,NOS-.0=NOS.0,BRESET2_-=RESET_,
        CP-=CP,SE-=SE,DUP-=DUP,PDI-.12=PDI.12,PDI-.11=PDI.11,
        PDI-.10=PDI.10,PDI-.9=PDI.9,PDI-.8=PDI.8,PDI-.7=PDI.7,
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,PLR_CS_-=PLR_CS_,
        WR_-=WR_,TST-=TST,SPR-.1=SPR.1,SPR-.0=SPR.0,U0.QD-.12=D.12,
        U0.QD-.11=D.11,U0.QD-.10=D.10,U0.QD-.9=D.9,U0.QD-.8=D.8,
        U0.QD-.7=D.7,U0.QD-.6=D.6,U0.QD-.5=D.5,U0.QD-.4=D.4,
        U0.QD-.3=D.3,U0.QD-.2=D.2,U0.QD-.1=D.1,U0.QD-.0=D.0);
U33(U33.Z-.12=Z.12,U33.Z-.11=Z.11,U33.Z-.10=Z.10,U33.Z-.9=Z.9,
        U33.Z-.8=Z.8,U33.Z-.7=Z.7,U33.Z-.6=Z.6,U33.Z-.5=Z.5,
        U33.Z-.4=Z.4,U33.Z-.3=Z.3,U33.Z-.2=Z.2,U33.Z-.1=Z.1,
        U33.Z-.0=Z.0) = MUX2X1W13X8(U36.Q2-.12=D0.12,U36.Q2-.11=D0.11,
        U36.Q2-.10=D0.10,U36.Q2-.9=D0.9,U36.Q2-.8=D0.8,
        U36.Q2-.7=D0.7,U36.Q2-.6=D0.6,U36.Q2-.5=D0.5,
        U36.Q2-.4=D0.4,U36.Q2-.3=D0.3,U36.Q2-.2=D0.2,
        U36.Q2-.1=D0.1,U36.Q2-.0=D0.0,BS-=S,U31.D2-.7=D1.7,
        U31.D2-.6=D1.6,U31.D2-.5=D1.5,U31.D2-.4=D1.4,
        U31.D2-.3=D1.3,U31.D2-.2=D1.2,U31.D2-.1=D1.1,
        U31.D2-.0=D1.0);
U3.12(U3.Q-.12=Q) = FD2SA(BRESET2_-=CD,BWAIT0-=TE,CP-=CP,
        U3.Q-.12=TI,U33.Z-.12=D);
U3.11(U3.Q-.11=Q) = FD2SA(BRESET2_-=CD,BWAIT0-=TE,CP-=CP,
        U3.Q-.11=TI,U33.Z-.11=D);
U3.10(U3.Q-.10=Q) = FD2SA(BRESET2_-=CD,BWAIT0-=TE,CP-=CP,
        U3.Q-.10=TI,U33.Z-.10=D);
U3.9(U3.Q-.9=Q) = FD2SA(BRESET2_-=CD,BWAIT0-=TE,CP-=CP,U3.Q-.9=TI,
        U33.Z-.9=D);
U3.8(U3.Q-.8=Q) = FD2SA(BRESET2_-=CD,BWAIT0-=TE,CP-=CP,U3.Q-.8=TI,
        U33.Z-.8=D);
U3.7(U3.Q-.7=Q) = FD2SA(BRESET2_-=CD,BWAIT0-=TE,CP-=CP,U3.Q-.7=TI,
        U33.Z-.7=D);
U3.6(U3.Q-.6=Q) = FD2SA(BRESET2_-=CD,BWAIT0-=TE,CP-=CP,U3.Q-.6=TI,
        U33.Z-.6=D);
U3.5(U3.Q-.5=Q) = FD2SA(BRESET2_-=CD,BWAIT0-=TE,CP-=CP,U3.Q-.5=TI,
        U33.Z-.5=D);
U3.4(U3.Q-.4=Q) = FD2SA(BRESET2_-=CD,BWAIT0-=TE,CP-=CP,U3.Q-.4=TI,
        U33.Z-.4=D);
U3.3(U3.Q-.3=Q) = FD2SA(BRESET2_-=CD,BWAIT0-=TE,CP-=CP,U3.Q-.3=TI,
        U33.Z-.3=D);
U3.2(U3.Q-.2=Q) = FD2SA(BRESET2_-=CD,BWAIT0-=TE,CP-=CP,U3.Q-.2=TI,
        U33.Z-.2=D);
U3.1(U3.Q-.1=Q) = FD2SA(BRESET2_-=CD,BWAIT0-=TE,CP-=CP,U3.Q-.1=TI,
        U33.Z-.1=D);
U3.0(U3.Q-.0=Q) = FD2SA(BRESET2_-=CD,BWAIT0-=TE,CP-=CP,U3.Q-.0=TI,
        U33.Z-.0=D);
U28(U28.S-.25=S.25,U28.S-.24=S.24,U28.S-.23=S.23,U28.S-.22=S.22,
        U28.S-.21=S.21,U28.S-.20=S.20,U28.S-.19=S.19,
        U28.S-.18=S.18,U28.S-.17=S.17,U28.S-.16=S.16,
        U28.S-.15=S.15,U28.S-.14=S.14,U28.S-.13=S.13,
        U28.S-.12=S.12,U28.S-.11=S.11,U28.S-.10=S.10,U28.S-.9=S.9,
        U28.S-.8=S.8,U28.S-.7=S.7,U28.S-.6=S.6,U28.S-.5=S.5,
        U28.S-.4=S.4,U28.S-.3=S.3,U28.S-.2=S.2,U28.S-.1=S.1,
        U28.S-.0=S.0) = DMB2120A(U17.TCX-=TCX,U28.TCYN-=TCYN,
        CD2-.11=Y.11,CD2-.10=Y.10,CD2-.9=Y.9,CD2-.8=Y.8,
```

```
        CD2-.7=Y.7,CD2-.6=Y.6,CD2-.5=Y.5,CD2-.4=Y.4,CD2-.3=Y.3,
        CD2-.2=Y.2,CD2-.1=Y.1,CD2-.0=Y.0,U3.Q-.12=X.12,
        U3.Q-.11=X.11,U3.Q-.10=X.10,U3.Q-.9=X.9,U3.Q-.8=X.8,
        U3.Q-.7=X.7,U3.Q-.6=X.6,U3.Q-.5=X.5,U3.Q-.4=X.4,
        U3.Q-.3=X.3,U3.Q-.2=X.2,U3.Q-.1=X.1,U3.Q-.0=X.0,
        U28.RND-=RND);
U24.15(U24.Q-.15=Q) = FD2SA(U24.Q-.15=TI,U24.D-.15=D,BRESET3_-=CD,
        BWAIT1-=TE,CP-=CP);
U24.14(U24.Q-.14=Q) = FD2SA(U24.Q-.14=TI,U24.D-.14=D,BRESET3_-=CD,
        BWAIT1-=TE,CP-=CP);
U24.13(U24.Q-.13=Q) = FD2SA(U24.Q-.13=TI,U24.D-.13=D,BRESET3_-=CD,
        BWAIT1-=TE,CP-=CP);
U24.12(U24.Q-.12=Q) = FD2SA(U24.Q-.12=TI,U24.D-.12=D,BRESET3_-=CD,
        BWAIT1-=TE,CP-=CP);
U24.11(U24.Q-.11=Q) = FD2SA(U24.Q-.11=TI,U24.D-.11=D,BRESET3_-=CD,
        BWAIT1-=TE,CP-=CP);
U24.10(U24.Q-.10=Q) = FD2SA(U24.Q-.10=TI,U24.D-.10=D,BRESET3_-=CD,
        BWAIT1-=TE,CP-=CP);
U24.9(U24.Q-.9=Q) = FD2SA(U24.Q-.9=TI,U24.D-.9=D,BRESET3_-=CD,
        BWAIT1-=TE,CP-=CP);
U24.8(U24.Q-.8=Q) = FD2SA(U24.Q-.8=TI,U24.D-.8=D,BRESET3_-=CD,
        BWAIT1-=TE,CP-=CP);
U24.7(U24.Q-.7=Q) = FD2SA(U24.Q-.7=TI,U24.D-.7=D,BRESET3_-=CD,
        BWAIT1-=TE,CP-=CP);
U24.6(U24.Q-.6=Q) = FD2SA(U24.Q-.6=TI,U24.D-.6=D,BRESET3_-=CD,
        BWAIT1-=TE,CP-=CP);
U24.5(U24.Q-.5=Q) = FD2SA(U24.Q-.5=TI,U24.D-.5=D,BRESET3_-=CD,
        BWAIT1-=TE,CP-=CP);
U24.4(U24.Q-.4=Q) = FD2SA(U24.Q-.4=TI,U24.D-.4=D,BRESET3_-=CD,
        BWAIT1-=TE,CP-=CP);
U24.3(U24.Q-.3=Q) = FD2SA(U24.Q-.3=TI,U24.D-.3=D,BRESET3_-=CD,
        BWAIT1-=TE,CP-=CP);
U24.2(U24.Q-.2=Q) = FD2SA(U24.Q-.2=TI,U24.D-.2=D,BRESET3_-=CD,
        BWAIT1-=TE,CP-=CP);
U24.1(U24.Q-.1=Q) = FD2SA(U24.Q-.1=TI,U24.D-.1=D,BRESET3_-=CD,
        BWAIT1-=TE,CP-=CP);
U24.0(U24.Q-.0=Q) = FD2SA(U24.Q-.0=TI,U24.D-.0=D,BRESET3_-=CD,
        BWAIT1-=TE,CP-=CP);
U20(U20.S-.16=S.16,U20.S-.15=S.15,U20.S-.14=S.14,U20.S-.13=S.13,
        U20.S-.12=S.12,U20.S-.11=S.11,U20.S-.10=S.10,U20.S-.9=S.9,
        U20.S-.8=S.8,U20.S-.7=S.7,U20.S-.6=S.6,U20.S-.5=S.5,
        U20.S-.4=S.4,U20.S-.3=S.3,U20.S-.2=S.2,U20.S-.1=S.1,
        U20.S-.0=S.0) = ADD16F1(U15.Q-.15=B.15,U15.Q-.14=B.14,
        U15.Q-.13=B.13,U15.Q-.12=B.12,U15.Q-.11=B.11,
        U15.Q-.10=B.10,U15.Q-.9=B.9,U15.Q-.8=B.8,U15.Q-.7=B.7,
        U15.Q-.6=B.6,U15.Q-.5=B.5,U15.Q-.4=B.4,U15.Q-.3=B.3,
        U15.Q-.2=B.2,U15.Q-.1=B.1,U15.Q-.0=B.0,U24.Q-.15=A.15,
        U24.Q-.14=A.14,U24.Q-.13=A.13,U24.Q-.12=A.12,
        U24.Q-.11=A.11,U24.Q-.10=A.10,U24.Q-.9=A.9,U24.Q-.8=A.8,
        U24.Q-.7=A.7,U24.Q-.6=A.6,U24.Q-.5=A.5,U24.Q-.4=A.4,
        U24.Q-.3=A.3,U24.Q-.2=A.2,U24.Q-.1=A.1,U24.Q-.0=A.0);
U15.15(U15.Q-.15=Q) = FD2SA(BRESET2_-=CD,U15.D-.15=D,BWAIT1-=TE,
        U15.Q-.15=TI,CP-=CP);
U15.14(U15.Q-.14=Q) = FD2SA(BRESET2_-=CD,U15.D-.14=D,BWAIT1-=TE,
        U15.Q-.14=TI,CP-=CP);
U15.13(U15.Q-.13=Q) = FD2SA(BRESET2_-=CD,U15.D-.13=D,BWAIT1-=TE,
        U15.Q-.13=TI,CP-=CP);
U15.12(U15.Q-.12=Q) = FD2SA(BRESET2_-=CD,U15.D-.12=D,BWAIT1-=TE,
        U15.Q-.12=TI,CP-=CP);
U15.11(U15.Q-.11=Q) = FD2SA(BRESET2_-=CD,U15.D-.11=D,BWAIT1-=TE,
        U15.Q-.11=TI,CP-=CP);
U15.10(U15.Q-.10=Q) = FD2SA(BRESET2_-=CD,U15.D-.10=D,BWAIT1-=TE,
        U15.Q-.10=TI,CP-=CP);
U15.9(U15.Q-.9=Q) = FD2SA(BRESET2_-=CD,U15.D-.9=D,BWAIT1-=TE,
        U15.Q-.9=TI,CP-=CP);
U15.8(U15.Q-.8=Q) = FD2SA(BRESET2_-=CD,U15.D-.8=D,BWAIT1-=TE,
        U15.Q-.8=TI,CP-=CP);
U15.7(U15.Q-.7=Q) = FD2SA(BRESET2_-=CD,U15.D-.7=D,BWAIT1-=TE,
        U15.Q-.7=TI,CP-=CP);
U15.6(U15.Q-.6=Q) = FD2SA(BRESET2_-=CD,U15.D-.6=D,BWAIT1-=TE,
        U15.Q-.6=TI,CP-=CP);
U15.5(U15.Q-.5=Q) = FD2SA(BRESET2_-=CD,U15.D-.5=D,BWAIT1-=TE,
        U15.Q-.5=TI,CP-=CP);
U15.4(U15.Q-.4=Q) = FD2SA(BRESET2_-=CD,U15.D-.4=D,BWAIT1-=TE,
        U15.Q-.4=TI,CP-=CP);
```

```
U15.3(U15.Q-.3=Q) = FD2SA(BRESET2_-=CD,U15.D-.3=D,BWAIT1-=TE,
        U15.Q-.3=TI,CP-=CP);
U15.2(U15.Q-.2=Q) = FD2SA(BRESET2_-=CD,U15.D-.2=D,BWAIT1-=TE,
        U15.Q-.2=TI,CP-=CP);
U15.1(U15.Q-.1=Q) = FD2SA(BRESET2_-=CD,U15.D-.1=D,BWAIT1-=TE,
        U15.Q-.1=TI,CP-=CP);
U15.0(U15.Q-.0=Q) = FD2SA(BRESET2_-=CD,U15.D-.0=D,BWAIT1-=TE,
        U15.Q-.0=TI,CP-=CP);
U27.15(U27.Q-.15=Q) = FD2SA(BRESET1_-=CD,U27.Q-.15=TI,BWAIT1-=TE,
        CP-=CP,U27.D-.15=D);
U27.14(U27.Q-.14=Q) = FD2SA(BRESET1_-=CD,U27.Q-.14=TI,BWAIT1-=TE,
        CP-=CP,U27.D-.14=D);
U27.13(U27.Q-.13=Q) = FD2SA(BRESET1_-=CD,U27.Q-.13=TI,BWAIT1-=TE,
        CP-=CP,U27.D-.13=D);
U27.12(U27.Q-.12=Q) = FD2SA(BRESET1_-=CD,U27.Q-.12=TI,BWAIT1-=TE,
        CP-=CP,U27.D-.12=D);
U27.11(U27.Q-.11=Q) = FD2SA(BRESET1_-=CD,U27.Q-.11=TI,BWAIT1-=TE,
        CP-=CP,U27.D-.11=D);
U27.10(U27.Q-.10=Q) = FD2SA(BRESET1_-=CD,U27.Q-.10=TI,BWAIT1-=TE,
        CP-=CP,U27.D-.10=D);
U27.9(U27.Q-.9=Q) = FD2SA(BRESET1_-=CD,U27.Q-.9=TI,BWAIT1-=TE,
        CP-=CP,U27.D-.9=D);
U27.8(U27.Q-.8=Q) = FD2SA(BRESET1_-=CD,U27.Q-.8=TI,BWAIT1-=TE,
        CP-=CP,U27.D-.8=D);
U27.7(U27.Q-.7=Q) = FD2SA(BRESET1_-=CD,U27.Q-.7=TI,BWAIT1-=TE,
        CP-=CP,U27.D-.7=D);
U27.6(U27.Q-.6=Q) = FD2SA(BRESET1_-=CD,U27.Q-.6=TI,BWAIT1-=TE,
        CP-=CP,U27.D-.6=D);
U27.5(U27.Q-.5=Q) = FD2SA(BRESET1_-=CD,U27.Q-.5=TI,BWAIT1-=TE,
        CP-=CP,U27.D-.5=D);
U27.4(U27.Q-.4=Q) = FD2SA(BRESET1_-=CD,U27.Q-.4=TI,BWAIT1-=TE,
        CP-=CP,U27.D-.4=D);
U27.3(U27.Q-.3=Q) = FD2SA(BRESET1_-=CD,U27.Q-.3=TI,BWAIT1-=TE,
        CP-=CP,U27.D-.3=D);
U27.2(U27.Q-.2=Q) = FD2SA(BRESET1_-=CD,U27.Q-.2=TI,BWAIT1-=TE,
        CP-=CP,U27.D-.2=D);
U27.1(U27.Q-.1=Q) = FD2SA(BRESET1_-=CD,U27.Q-.1=TI,BWAIT1-=TE,
        CP-=CP,U27.D-.1=D);
U27.0(U27.Q-.0=Q) = FD2SA(BRESET1_-=CD,U27.Q-.0=TI,BWAIT1-=TE,
        CP-=CP,U27.D-.0=D);
U6(BRESET0_-=Z) = B3A(RESET_-=A);
U7(BRESET1_-=Z) = B3A(BRESET0_-=A);
U8(BRESET2_-=Z) = B3A(BRESET1_-=A);
U12.15(U12.Q-.15=Q) = FD2SA(CP-=CP,BWAIT2-=TE,BRESET1_-=CD,
        U13.Q-.15=D,U12.Q-.15=TI);
U12.14(U12.Q-.14=Q) = FD2SA(CP-=CP,BWAIT2-=TE,BRESET1_-=CD,
        U13.Q-.14=D,U12.Q-.14=TI);
U12.13(U12.Q-.13=Q) = FD2SA(CP-=CP,BWAIT2-=TE,BRESET1_-=CD,
        U13.Q-.13=D,U12.Q-.13=TI);
U12.12(U12.Q-.12=Q) = FD2SA(CP-=CP,BWAIT2-=TE,BRESET1_-=CD,
        U13.Q-.12=D,U12.Q-.12=TI);
U12.11(U12.Q-.11=Q) = FD2SA(CP-=CP,BWAIT2-=TE,BRESET1_-=CD,
        U13.Q-.11=D,U12.Q-.11=TI);
U12.10(U12.Q-.10=Q) = FD2SA(CP-=CP,BWAIT2-=TE,BRESET1_-=CD,
        U13.Q-.10=D,U12.Q-.10=TI);
U12.9(U12.Q-.9=Q) = FD2SA(CP-=CP,BWAIT2-=TE,BRESET1_-=CD,
        U13.Q-.9=D,U12.Q-.9=TI);
U12.8(U12.Q-.8=Q) = FD2SA(CP-=CP,BWAIT2-=TE,BRESET1_-=CD,
        U13.Q-.8=D,U12.Q-.8=TI);
U12.7(U12.Q-.7=Q) = FD2SA(CP-=CP,BWAIT2-=TE,BRESET1_-=CD,
        U13.Q-.7=D,U12.Q-.7=TI);
U12.6(U12.Q-.6=Q) = FD2SA(CP-=CP,BWAIT2-=TE,BRESET1_-=CD,
        U13.Q-.6=D,U12.Q-.6=TI);
U12.5(U12.Q-.5=Q) = FD2SA(CP-=CP,BWAIT2-=TE,BRESET1_-=CD,
        U13.Q-.5=D,U12.Q-.5=TI);
U12.4(U12.Q-.4=Q) = FD2SA(CP-=CP,BWAIT2-=TE,BRESET1_-=CD,
        U13.Q-.4=D,U12.Q-.4=TI);
U12.3(U12.Q-.3=Q) = FD2SA(CP-=CP,BWAIT2-=TE,BRESET1_-=CD,
        U13.Q-.3=D,U12.Q-.3=TI);
U12.2(U12.Q-.2=Q) = FD2SA(CP-=CP,BWAIT2-=TE,BRESET1_-=CD,
        U13.Q-.2=D,U12.Q-.2=TI);
U12.1(U12.Q-.1=Q) = FD2SA(CP-=CP,BWAIT2-=TE,BRESET1_-=CD,
        U13.Q-.1=D,U12.Q-.1=TI);
U12.0(U12.Q-.0=Q) = FD2SA(CP-=CP,BWAIT2-=TE,BRESET1_-=CD,
        U13.Q-.0=D,U12.Q-.0=TI);
```

```
U38.15(PDO2-.15=Z) = MUX41C(SEL11-=B,SEL10-=A,U38.D1-.15=D1,
        U38.D0-.15=D0,U38.D2-.15=D2,U38.D3-.15=D3);
U38.14(PDO2-.14=Z) = MUX41C(SEL11-=B,SEL10-=A,U38.D1-.14=D1,
        U38.D0-.14=D0,U38.D2-.14=D2,U38.D3-.14=D3);
U38.13(PDO2-.13=Z) = MUX41C(SEL11-=B,SEL10-=A,U38.D1-.13=D1,
        U38.D0-.13=D0,U38.D2-.13=D2,U38.D3-.13=D3);
U38.12(PDO2-.12=Z) = MUX41C(SEL11-=B,SEL10-=A,U38.D1-.12=D1,
        U38.D0-.12=D0,U38.D2-.12=D2,U38.D3-.12=D3);
U38.11(PDO2-.11=Z) = MUX41C(SEL11-=B,SEL10-=A,U38.D1-.11=D1,
        U38.D0-.11=D0,U38.D2-.11=D2,U38.D3-.11=D3);
U38.10(PDO2-.10=Z) = MUX41C(SEL11-=B,SEL10-=A,U38.D1-.10=D1,
        U38.D0-.10=D0,U38.D2-.10=D2,U38.D3-.10=D3);
U38.9(PDO2-.9=Z) = MUX41C(SEL11-=B,SEL10-=A,U38.D1-.9=D1,
        U38.D0-.9=D0,U38.D2-.9=D2,U38.D3-.9=D3);
U38.8(PDO2-.8=Z) = MUX41C(SEL11-=B,SEL10-=A,U38.D1-.8=D1,
        U38.D0-.8=D0,U38.D2-.8=D2,U38.D3-.8=D3);
U38.7(PDO2-.7=Z) = MUX41C(SEL11-=B,SEL10-=A,U38.D1-.7=D1,
        U38.D0-.7=D0,U38.D2-.7=D2,U38.D3-.7=D3);
U38.6(PDO2-.6=Z) = MUX41C(SEL11-=B,SEL10-=A,U38.D1-.6=D1,
        U38.D0-.6=D0,U38.D2-.6=D2,U38.D3-.6=D3);
U38.5(PDO2-.5=Z) = MUX41C(SEL11-=B,SEL10-=A,U38.D1-.5=D1,
        U38.D0-.5=D0,U38.D2-.5=D2,U38.D3-.5=D3);
U38.4(PDO2-.4=Z) = MUX41C(SEL11-=B,SEL10-=A,U38.D1-.4=D1,
        U38.D0-.4=D0,U38.D2-.4=D2,U38.D3-.4=D3);
U38.3(PDO2-.3=Z) = MUX41C(SEL11-=B,SEL10-=A,U38.D1-.3=D1,
        U38.D0-.3=D0,U38.D2-.3=D2,U38.D3-.3=D3);
U38.2(PDO2-.2=Z) = MUX41C(SEL11-=B,SEL10-=A,U38.D1-.2=D1,
        U38.D0-.2=D0,U38.D2-.2=D2,U38.D3-.2=D3);
U38.1(PDO2-.1=Z) = MUX41C(SEL11-=B,SEL10-=A,U38.D1-.1=D1,
        U38.D0-.1=D0,U38.D2-.1=D2,U38.D3-.1=D3);
U38.0(PDO2-.0=Z) = MUX41C(SEL11-=B,SEL10-=A,U38.D1-.0=D1,
        U38.D0-.0=D0,U38.D2-.0=D2,U38.D3-.0=D3);
U23.16(U23.Q-.16=Q) = FD2SA(BWAIT2-=TE,CP-=CP,BRESET2_-=CD,
        U26.S-.16=D,U23.Q-.16=TI);
U23.15(U23.Q-.15=Q) = FD2SA(BWAIT2-=TE,CP-=CP,BRESET2_-=CD,
        U26.S-.15=D,U23.Q-.15=TI);
U23.14(U23.Q-.14=Q) = FD2SA(BWAIT2-=TE,CP-=CP,BRESET2_-=CD,
        U26.S-.14=D,U23.Q-.14=TI);
U23.13(U23.Q-.13=Q) = FD2SA(BWAIT2-=TE,CP-=CP,BRESET2_-=CD,
        U26.S-.13=D,U23.Q-.13=TI);
U23.12(U23.Q-.12=Q) = FD2SA(BWAIT2-=TE,CP-=CP,BRESET2_-=CD,
        U26.S-.12=D,U23.Q-.12=TI);
U23.11(U23.Q-.11=Q) = FD2SA(BWAIT2-=TE,CP-=CP,BRESET2_-=CD,
        U26.S-.11=D,U23.Q-.11=TI);
U23.10(U23.Q-.10=Q) = FD2SA(BWAIT2-=TE,CP-=CP,BRESET2_-=CD,
        U26.S-.10=D,U23.Q-.10=TI);
U23.9(U23.Q-.9=Q) = FD2SA(BWAIT2-=TE,CP-=CP,BRESET2_-=CD,
        U26.S-.9=D,U23.Q-.9=TI);
U23.8(U23.Q-.8=Q) = FD2SA(BWAIT2-=TE,CP-=CP,BRESET2_-=CD,
        U26.S-.8=D,U23.Q-.8=TI);
U23.7(U23.Q-.7=Q) = FD2SA(BWAIT2-=TE,CP-=CP,BRESET2_-=CD,
        U26.S-.7=D,U23.Q-.7=TI);
U23.6(U23.Q-.6=Q) = FD2SA(BWAIT2-=TE,CP-=CP,BRESET2_-=CD,
        U26.S-.6=D,U23.Q-.6=TI);
U23.5(U23.Q-.5=Q) = FD2SA(BWAIT2-=TE,CP-=CP,BRESET2_-=CD,
        U26.S-.5=D,U23.Q-.5=TI);
U23.4(U23.Q-.4=Q) = FD2SA(BWAIT2-=TE,CP-=CP,BRESET2_-=CD,
        U26.S-.4=D,U23.Q-.4=TI);
U23.3(U23.Q-.3=Q) = FD2SA(BWAIT2-=TE,CP-=CP,BRESET2_-=CD,
        U26.S-.3=D,U23.Q-.3=TI);
U23.2(U23.Q-.2=Q) = FD2SA(BWAIT2-=TE,CP-=CP,BRESET2_-=CD,
        U26.S-.2=D,U23.Q-.2=TI);
U23.1(U23.Q-.1=Q) = FD2SA(BWAIT2-=TE,CP-=CP,BRESET2_-=CD,
        U26.S-.1=D,U23.Q-.1=TI);
U23.0(U23.Q-.0=Q) = FD2SA(BWAIT2-=TE,CP-=CP,BRESET2_-=CD,
        U26.S-.0=D,U23.Q-.0=TI);
U11(BRESET3_-=Z) = B3A(BRESET2_-=A);
U0.12(U0.QD-.12=QD,CNVL-.12=Q0) = SRDLY(NOS-.1=NOS.1,NOS-.0=NOS.0,
        DLY_POL-=DLY_POL,CP-=CP,BWAIT3-=WAIT,U0.D-.12=D,
        BRESET3_-=RESET_);
U0.11(U0.QD-.11=QD,CNVL-.11=Q0) = SRDLY(NOS-.1=NOS.1,NOS-.0=NOS.0,
        DLY_POL-=DLY_POL,CP-=CP,BWAIT3-=WAIT,U0.D-.11=D,
        BRESET3_-=RESET_);
U0.10(U0.QD-.10=QD,CNVL-.10=Q0) = SRDLY(NOS-.1=NOS.1,NOS-.0=NOS.0,
        DLY_POL-=DLY_POL,CP-=CP,BWAIT3-=WAIT,U0.D-.10=D,
        BRESET3_-=RESET_);
```

```
U0.9(U0.QD-.9=QD,CNVL-.9=Q0) = SRDLY(NOS-.1=NOS.1,NOS-.0=NOS.0,
        DLY_POL-=DLY_POL,CP-=CP,BWAIT3-=WAIT,U0.D-.9=D,
        BRESET3_-=RESET_);
U0.8(U0.QD-.8=QD,CNVL-.8=Q0) = SRDLY(NOS-.1=NOS.1,NOS-.0=NOS.0,
        DLY_POL-=DLY_POL,CP-=CP,BWAIT3-=WAIT,U0.D-.8=D,
        BRESET3_-=RESET_);
U0.7(U0.QD-.7=QD,CNVL-.7=Q0) = SRDLY(NOS-.1=NOS.1,NOS-.0=NOS.0,
        DLY_POL-=DLY_POL,CP-=CP,BWAIT3-=WAIT,U0.D-.7=D,
        BRESET3_-=RESET_);
U0.6(U0.QD-.6=QD,CNVL-.6=Q0) = SRDLY(NOS-.1=NOS.1,NOS-.0=NOS.0,
        DLY_POL-=DLY_POL,CP-=CP,BWAIT3-=WAIT,U0.D-.6=D,
        BRESET3_-=RESET_);
U0.5(U0.QD-.5=QD,CNVL-.5=Q0) = SRDLY(NOS-.1=NOS.1,NOS-.0=NOS.0,
        DLY_POL-=DLY_POL,CP-=CP,BWAIT3-=WAIT,U0.D-.5=D,
        BRESET3_-=RESET_);
U0.4(U0.QD-.4=QD,CNVL-.4=Q0) = SRDLY(NOS-.1=NOS.1,NOS-.0=NOS.0,
        DLY_POL-=DLY_POL,CP-=CP,BWAIT3-=WAIT,U0.D-.4=D,
        BRESET3_-=RESET_);
U0.3(U0.QD-.3=QD,CNVL-.3=Q0) = SRDLY(NOS-.1=NOS.1,NOS-.0=NOS.0,
        DLY_POL-=DLY_POL,CP-=CP,BWAIT3-=WAIT,U0.D-.3=D,
        BRESET3_-=RESET_);
U0.2(U0.QD-.2=QD,CNVL-.2=Q0) = SRDLY(NOS-.1=NOS.1,NOS-.0=NOS.0,
        DLY_POL-=DLY_POL,CP-=CP,BWAIT3-=WAIT,U0.D-.2=D,
        BRESET3_-=RESET_);
U0.1(U0.QD-.1=QD,CNVL-.1=Q0) = SRDLY(NOS-.1=NOS.1,NOS-.0=NOS.0,
        DLY_POL-=DLY_POL,CP-=CP,BWAIT3-=WAIT,U0.D-.1=D,
        BRESET3_-=RESET_);
U0.0(U0.QD-.0=QD,CNVL-.0=Q0) = SRDLY(NOS-.1=NOS.1,NOS-.0=NOS.0,
        DLY_POL-=DLY_POL,CP-=CP,BWAIT3-=WAIT,U0.D-.0=D,
        BRESET3_-=RESET_);
U14.15(U14.Q-.15=Q) = FD2SA(U14.Q-.15=TI,BRESET1_-=CD,U14.D-.15=D,
        BWAIT3-=TE,CP-=CP);
U14.14(U14.Q-.14=Q) = FD2SA(U14.Q-.14=TI,BRESET1_-=CD,U14.D-.14=D,
        BWAIT3-=TE,CP-=CP);
U14.13(U14.Q-.13=Q) = FD2SA(U14.Q-.13=TI,BRESET1_-=CD,U14.D-.13=D,
        BWAIT3-=TE,CP-=CP);
U14.12(U14.Q-.12=Q) = FD2SA(U14.Q-.12=TI,BRESET1_-=CD,U14.D-.12=D,
        BWAIT3-=TE,CP-=CP);
U14.11(U14.Q-.11=Q) = FD2SA(U14.Q-.11=TI,BRESET1_-=CD,U14.D-.11=D,
        BWAIT3-=TE,CP-=CP);
U14.10(U14.Q-.10=Q) = FD2SA(U14.Q-.10=TI,BRESET1_-=CD,U14.D-.10=D,
        BWAIT3-=TE,CP-=CP);
U14.9(U14.Q-.9=Q) = FD2SA(U14.Q-.9=TI,BRESET1_-=CD,U14.D-.9=D,
        BWAIT3-=TE,CP-=CP);
U14.8(U14.Q-.8=Q) = FD2SA(U14.Q-.8=TI,BRESET1_-=CD,U14.D-.8=D,
        BWAIT3-=TE,CP-=CP);
U14.7(U14.Q-.7=Q) = FD2SA(U14.Q-.7=TI,BRESET1_-=CD,U14.D-.7=D,
        BWAIT3-=TE,CP-=CP);
U14.6(U14.Q-.6=Q) = FD2SA(U14.Q-.6=TI,BRESET1_-=CD,U14.D-.6=D,
        BWAIT3-=TE,CP-=CP);
U14.5(U14.Q-.5=Q) = FD2SA(U14.Q-.5=TI,BRESET1_-=CD,U14.D-.5=D,
        BWAIT3-=TE,CP-=CP);
U14.4(U14.Q-.4=Q) = FD2SA(U14.Q-.4=TI,BRESET1_-=CD,U14.D-.4=D,
        BWAIT3-=TE,CP-=CP);
U14.3(U14.Q-.3=Q) = FD2SA(U14.Q-.3=TI,BRESET1_-=CD,U14.D-.3=D,
        BWAIT3-=TE,CP-=CP);
U14.2(U14.Q-.2=Q) = FD2SA(U14.Q-.2=TI,BRESET1_-=CD,U14.D-.2=D,
        BWAIT3-=TE,CP-=CP);
U14.1(U14.Q-.1=Q) = FD2SA(U14.Q-.1=TI,BRESET1_-=CD,U14.D-.1=D,
        BWAIT3-=TE,CP-=CP);
U14.0(U14.Q-.0=Q) = FD2SA(U14.Q-.0=TI,BRESET1_-=CD,U14.D-.0=D,
        BWAIT3-=TE,CP-=CP);
U13.15(U13.Q-.15=Q) = FD2SA(U13.Q-.15=TI,CP-=CP,BRESET0_-=CD,
        BWAIT4-=TE,U14.Q-.15=D);
U13.14(U13.Q-.14=Q) = FD2SA(U13.Q-.14=TI,CP-=CP,BRESET0_-=CD,
        BWAIT4-=TE,U14.Q-.14=D);
U13.13(U13.Q-.13=Q) = FD2SA(U13.Q-.13=TI,CP-=CP,BRESET0_-=CD,
        BWAIT4-=TE,U14.Q-.13=D);
U13.12(U13.Q-.12=Q) = FD2SA(U13.Q-.12=TI,CP-=CP,BRESET0_-=CD,
        BWAIT4-=TE,U14.Q-.12=D);
U13.11(U13.Q-.11=Q) = FD2SA(U13.Q-.11=TI,CP-=CP,BRESET0_-=CD,
        BWAIT4-=TE,U14.Q-.11=D);
U13.10(U13.Q-.10=Q) = FD2SA(U13.Q-.10=TI,CP-=CP,BRESET0_-=CD,
        BWAIT4-=TE,U14.Q-.10=D);
```

```
U13.9(U13.Q-.9=Q) = FD2SA(U13.Q-.9=TI,CP-=CP,BRESET0_-=CD,
        BWAIT4-=TE,U14.Q-.9=D);
U13.8(U13.Q-.8=Q) = FD2SA(U13.Q-.8=TI,CP-=CP,BRESET0_-=CD,
        BWAIT4-=TE,U14.Q-.8=D);
U13.7(U13.Q-.7=Q) = FD2SA(U13.Q-.7=TI,CP-=CP,BRESET0_-=CD,
        BWAIT4-=TE,U14.Q-.7=D);
U13.6(U13.Q-.6=Q) = FD2SA(U13.Q-.6=TI,CP-=CP,BRESET0_-=CD,
        BWAIT4-=TE,U14.Q-.6=D);
U13.5(U13.Q-.5=Q) = FD2SA(U13.Q-.5=TI,CP-=CP,BRESET0_-=CD,
        BWAIT4-=TE,U14.Q-.5=D);
U13.4(U13.Q-.4=Q) = FD2SA(U13.Q-.4=TI,CP-=CP,BRESET0_-=CD,
        BWAIT4-=TE,U14.Q-.4=D);
U13.3(U13.Q-.3=Q) = FD2SA(U13.Q-.3=TI,CP-=CP,BRESET0_-=CD,
        BWAIT4-=TE,U14.Q-.3=D);
U13.2(U13.Q-.2=Q) = FD2SA(U13.Q-.2=TI,CP-=CP,BRESET0_-=CD,
        BWAIT4-=TE,U14.Q-.2=D);
U13.1(U13.Q-.1=Q) = FD2SA(U13.Q-.1=TI,CP-=CP,BRESET0_-=CD,
        BWAIT4-=TE,U14.Q-.1=D);
U13.0(U13.Q-.0=Q) = FD2SA(U13.Q-.0=TI,CP-=CP,BRESET0_-=CD,
        BWAIT4-=TE,U14.Q-.0=D);
U5.12(U5.Q-.12=Q) = FD2SA(CP-=CP,BRESET0_-=CD,U5.Q-.12=TI,
        U37.Z-.12=D,BWAIT4-=TE);
U5.11(U5.Q-.11=Q) = FD2SA(CP-=CP,BRESET0_-=CD,U5.Q-.11=TI,
        U37.Z-.11=D,BWAIT4-=TE);
U5.10(U5.Q-.10=Q) = FD2SA(CP-=CP,BRESET0_-=CD,U5.Q-.10=TI,
        U37.Z-.10=D,BWAIT4-=TE);
U5.9(U5.Q-.9=Q) = FD2SA(CP-=CP,BRESET0_-=CD,U5.Q-.9=TI,U37.Z-.9=D,
        BWAIT4-=TE);
U5.8(U5.Q-.8=Q) = FD2SA(CP-=CP,BRESET0_-=CD,U5.Q-.8=TI,U37.Z-.8=D,
        BWAIT4-=TE);
U5.7(U5.Q-.7=Q) = FD2SA(CP-=CP,BRESET0_-=CD,U5.Q-.7=TI,U37.Z-.7=D,
        BWAIT4-=TE);
U5.6(U5.Q-.6=Q) = FD2SA(CP-=CP,BRESET0_-=CD,U5.Q-.6=TI,U37.Z-.6=D,
        BWAIT4-=TE);
U5.5(U5.Q-.5=Q) = FD2SA(CP-=CP,BRESET0_-=CD,U5.Q-.5=TI,U37.Z-.5=D,
        BWAIT4-=TE);
U5.4(U5.Q-.4=Q) = FD2SA(CP-=CP,BRESET0_-=CD,U5.Q-.4=TI,U37.Z-.4=D,
        BWAIT4-=TE);
U5.3(U5.Q-.3=Q) = FD2SA(CP-=CP,BRESET0_-=CD,U5.Q-.3=TI,U37.Z-.3=D,
        BWAIT4-=TE);
U5.2(U5.Q-.2=Q) = FD2SA(CP-=CP,BRESET0_-=CD,U5.Q-.2=TI,U37.Z-.2=D,
        BWAIT4-=TE);
U5.1(U5.Q-.1=Q) = FD2SA(CP-=CP,BRESET0_-=CD,U5.Q-.1=TI,U37.Z-.1=D,
        BWAIT4-=TE);
U5.0(U5.Q-.0=Q) = FD2SA(CP-=CP,BRESET0_-=CD,U5.Q-.0=TI,U37.Z-.0=D,
        BWAIT4-=TE);
U16(U16.S-.25=S.25,U16.S-.24=S.24,U16.S-.23=S.23,U16.S-.22=S.22,
        U16.S-.21=S.21,U16.S-.20=S.20,U16.S-.19=S.19,
        U16.S-.18=S.18,U16.S-.17=S.17,U16.S-.16=S.16,
        U16.S-.15=S.15,U16.S-.14=S.14,U16.S-.13=S.13,
        U16.S-.12=S.12,U16.S-.11=S.11,U16.S-.10=S.10,U16.S-.9=S.9,
        U16.S-.8=S.8,U16.S-.7=S.7,U16.S-.6=S.6,U16.S-.5=S.5,
        U16.S-.4=S.4,U16.S-.3=S.3,U16.S-.2=S.2,U16.S-.1=S.1,
        U16.S-.0=S.0) = DMB2120A(U16.TCYN-=TCYN,U17.TCX-=TCX,
        CD4-.11=Y.11,CD4-.10=Y.10,CD4-.9=Y.9,CD4-.8=Y.8,
        CD4-.7=Y.7,CD4-.6=Y.6,CD4-.5=Y.5,CD4-.4=Y.4,CD4-.3=Y.3,
        CD4-.2=Y.2,CD4-.1=Y.1,CD4-.0=Y.0,U5.Q-.12=X.12,
        U5.Q-.11=X.11,U5.Q-.10=X.10,U5.Q-.9=X.9,U5.Q-.8=X.8,
        U5.Q-.7=X.7,U5.Q-.6=X.6,U5.Q-.5=X.5,U5.Q-.4=X.4,
        U5.Q-.3=X.3,U5.Q-.2=X.2,U5.Q-.1=X.1,U5.Q-.0=X.0,
        U16.RND-=RND);
U30(U30.S-.25=S.25,U30.S-.24=S.24,U30.S-.23=S.23,U30.S-.22=S.22,
        U30.S-.21=S.21,U30.S-.20=S.20,U30.S-.19=S.19,
        U30.S-.18=S.18,U30.S-.17=S.17,U30.S-.16=S.16,
        U30.S-.15=S.15,U30.S-.14=S.14,U30.S-.13=S.13,
        U30.S-.12=S.12,U30.S-.11=S.11,U30.S-.10=S.10,U30.S-.9=S.9,
        U30.S-.8=S.8,U30.S-.7=S.7,U30.S-.6=S.6,U30.S-.5=S.5,
        U30.S-.4=S.4,U30.S-.3=S.3,U30.S-.2=S.2,U30.S-.1=S.1,
        U30.S-.0=S.0) = DMB2120A(U30.TCYN-=TCYN,U17.TCX-=TCX,
        CD0-.11=Y.11,CD0-.10=Y.10,CD0-.9=Y.9,CD0-.8=Y.8,
        CD0-.7=Y.7,CD0-.6=Y.6,CD0-.5=Y.5,CD0-.4=Y.4,CD0-.3=Y.3,
        CD0-.2=Y.2,CD0-.1=Y.1,CD0-.0=Y.0,U1.Q-.12=X.12,
        U1.Q-.11=X.11,U1.Q-.10=X.10,U1.Q-.9=X.9,U1.Q-.8=X.8,
        U1.Q-.7=X.7,U1.Q-.6=X.6,U1.Q-.5=X.5,U1.Q-.4=X.4,
        U1.Q-.3=X.3,U1.Q-.2=X.2,U1.Q-.1=X.1,U1.Q-.0=X.0,
        U30.RND-=RND);
```

```
U1.12(U1.Q-.12=Q) = FD2SA(BWAIT0-=TE,U35.Z-.12=D,BRESET0_-=CD,
        CP-=CP,U1.Q-.12=TI);
U1.11(U1.Q-.11=Q) = FD2SA(BWAIT0-=TE,U35.Z-.11=D,BRESET0_-=CD,
        CP-=CP,U1.Q-.11=TI);
U1.10(U1.Q-.10=Q) = FD2SA(BWAIT0-=TE,U35.Z-.10=D,BRESET0_-=CD,
        CP-=CP,U1.Q-.10=TI);
U1.9(U1.Q-.9=Q) = FD2SA(BWAIT0-=TE,U35.Z-.9=D,BRESET0_-=CD,CP-=CP,
        U1.Q-.9=TI);
U1.8(U1.Q-.8=Q) = FD2SA(BWAIT0-=TE,U35.Z-.8=D,BRESET0_-=CD,CP-=CP,
        U1.Q-.8=TI);
U1.7(U1.Q-.7=Q) = FD2SA(BWAIT0-=TE,U35.Z-.7=D,BRESET0_-=CD,CP-=CP,
        U1.Q-.7=TI);
U1.6(U1.Q-.6=Q) = FD2SA(BWAIT0-=TE,U35.Z-.6=D,BRESET0_-=CD,CP-=CP,
        U1.Q-.6=TI);
U1.5(U1.Q-.5=Q) = FD2SA(BWAIT0-=TE,U35.Z-.5=D,BRESET0_-=CD,CP-=CP,
        U1.Q-.5=TI);
U1.4(U1.Q-.4=Q) = FD2SA(BWAIT0-=TE,U35.Z-.4=D,BRESET0_-=CD,CP-=CP,
        U1.Q-.4=TI);
U1.3(U1.Q-.3=Q) = FD2SA(BWAIT0-=TE,U35.Z-.3=D,BRESET0_-=CD,CP-=CP,
        U1.Q-.3=TI);
U1.2(U1.Q-.2=Q) = FD2SA(BWAIT0-=TE,U35.Z-.2=D,BRESET0_-=CD,CP-=CP,
        U1.Q-.2=TI);
U1.1(U1.Q-.1=Q) = FD2SA(BWAIT0-=TE,U35.Z-.1=D,BRESET0_-=CD,CP-=CP,
        U1.Q-.1=TI);
U1.0(U1.Q-.0=Q) = FD2SA(BWAIT0-=TE,U35.Z-.0=D,BRESET0_-=CD,CP-=CP,
        U1.Q-.0=TI);
U25.15(U25.Q-.15=Q) = FD2SA(U25.D-.15=D,U25.Q-.15=TI,BWAIT1-=TE,
        BRESET0_-=CD,CP-=CP);
U25.14(U25.Q-.14=Q) = FD2SA(U25.D-.14=D,U25.Q-.14=TI,BWAIT1-=TE,
        BRESET0_-=CD,CP-=CP);
U25.13(U25.Q-.13=Q) = FD2SA(U25.D-.13=D,U25.Q-.13=TI,BWAIT1-=TE,
        BRESET0_-=CD,CP-=CP);
U25.12(U25.Q-.12=Q) = FD2SA(U25.D-.12=D,U25.Q-.12=TI,BWAIT1-=TE,
        BRESET0_-=CD,CP-=CP);
U25.11(U25.Q-.11=Q) = FD2SA(U25.D-.11=D,U25.Q-.11=TI,BWAIT1-=TE,
        BRESET0_-=CD,CP-=CP);
U25.10(U25.Q-.10=Q) = FD2SA(U25.D-.10=D,U25.Q-.10=TI,BWAIT1-=TE,
        BRESET0_-=CD,CP-=CP);
U25.9(U25.Q-.9=Q) = FD2SA(U25.D-.9=D,U25.Q-.9=TI,BWAIT1-=TE,
        BRESET0_-=CD,CP-=CP);
U25.8(U25.Q-.8=Q) = FD2SA(U25.D-.8=D,U25.Q-.8=TI,BWAIT1-=TE,
        BRESET0_-=CD,CP-=CP);
U25.7(U25.Q-.7=Q) = FD2SA(U25.D-.7=D,U25.Q-.7=TI,BWAIT1-=TE,
        BRESET0_-=CD,CP-=CP);
U25.6(U25.Q-.6=Q) = FD2SA(U25.D-.6=D,U25.Q-.6=TI,BWAIT1-=TE,
        BRESET0_-=CD,CP-=CP);
U25.5(U25.Q-.5=Q) = FD2SA(U25.D-.5=D,U25.Q-.5=TI,BWAIT1-=TE,
        BRESET0_-=CD,CP-=CP);
U25.4(U25.Q-.4=Q) = FD2SA(U25.D-.4=D,U25.Q-.4=TI,BWAIT1-=TE,
        BRESET0_-=CD,CP-=CP);
U25.3(U25.Q-.3=Q) = FD2SA(U25.D-.3=D,U25.Q-.3=TI,BWAIT1-=TE,
        BRESET0_-=CD,CP-=CP);
U25.2(U25.Q-.2=Q) = FD2SA(U25.D-.2=D,U25.Q-.2=TI,BWAIT1-=TE,
        BRESET0_-=CD,CP-=CP);
U25.1(U25.Q-.1=Q) = FD2SA(U25.D-.1=D,U25.Q-.1=TI,BWAIT1-=TE,
        BRESET0_-=CD,CP-=CP);
U25.0(U25.Q-.0=Q) = FD2SA(U25.D-.0=D,U25.Q-.0=TI,BWAIT1-=TE,
        BRESET0_-=CD,CP-=CP);
U19.16(U19.Q-.16=Q) = FD2SA(U19.Q-.16=TI,BWAIT2-=TE,BRESET3_-=CD,
        U20.S-.16=D,CP-=CP);
U19.15(U19.Q-.15=Q) = FD2SA(U19.Q-.15=TI,BWAIT2-=TE,BRESET3_-=CD,
        U20.S-.15=D,CP-=CP);
U19.14(U19.Q-.14=Q) = FD2SA(U19.Q-.14=TI,BWAIT2-=TE,BRESET3_-=CD,
        U20.S-.14=D,CP-=CP);
U19.13(U19.Q-.13=Q) = FD2SA(U19.Q-.13=TI,BWAIT2-=TE,BRESET3_-=CD,
        U20.S-.13=D,CP-=CP);
U19.12(U19.Q-.12=Q) = FD2SA(U19.Q-.12=TI,BWAIT2-=TE,BRESET3_-=CD,
        U20.S-.12=D,CP-=CP);
U19.11(U19.Q-.11=Q) = FD2SA(U19.Q-.11=TI,BWAIT2-=TE,BRESET3_-=CD,
        U20.S-.11=D,CP-=CP);
U19.10(U19.Q-.10=Q) = FD2SA(U19.Q-.10=TI,BWAIT2-=TE,BRESET3_-=CD,
        U20.S-.10=D,CP-=CP);
U19.9(U19.Q-.9=Q) = FD2SA(U19.Q-.9=TI,BWAIT2-=TE,BRESET3_-=CD,
        U20.S-.9=D,CP-=CP);
```

```
U19.8(U19.Q-.8=Q) = FD2SA(U19.Q-.8=TI,BWAIT2-=TE,BRESET3_-=CD,
        U20.S-.8=D,CP-=CP);
U19.7(U19.Q-.7=Q) = FD2SA(U19.Q-.7=TI,BWAIT2-=TE,BRESET3_-=CD,
        U20.S-.7=D,CP-=CP);
U19.6(U19.Q-.6=Q) = FD2SA(U19.Q-.6=TI,BWAIT2-=TE,BRESET3_-=CD,
        U20.S-.6=D,CP-=CP);
U19.5(U19.Q-.5=Q) = FD2SA(U19.Q-.5=TI,BWAIT2-=TE,BRESET3_-=CD,
        U20.S-.5=D,CP-=CP);
U19.4(U19.Q-.4=Q) = FD2SA(U19.Q-.4=TI,BWAIT2-=TE,BRESET3_-=CD,
        U20.S-.4=D,CP-=CP);
U19.3(U19.Q-.3=Q) = FD2SA(U19.Q-.3=TI,BWAIT2-=TE,BRESET3_-=CD,
        U20.S-.3=D,CP-=CP);
U19.2(U19.Q-.2=Q) = FD2SA(U19.Q-.2=TI,BWAIT2-=TE,BRESET3_-=CD,
        U20.S-.2=D,CP-=CP);
U19.1(U19.Q-.1=Q) = FD2SA(U19.Q-.1=TI,BWAIT2-=TE,BRESET3_-=CD,
        U20.S-.1=D,CP-=CP);
U19.0(U19.Q-.0=Q) = FD2SA(U19.Q-.0=TI,BWAIT2-=TE,BRESET3_-=CD,
        U20.S-.0=D,CP-=CP);
U22(U22.S-.17=S.17,U22.S-.16=S.16,U22.S-.15=S.15,U22.S-.14=S.14,
        U22.S-.13=S.13,U22.S-.12=S.12,U22.S-.11=S.11,
        U22.S-.10=S.10,U22.S-.9=S.9,U22.S-.8=S.8,U22.S-.7=S.7,
        U22.S-.6=S.6,U22.S-.5=S.5,U22.S-.4=S.4,U22.S-.3=S.3,
        U22.S-.2=S.2,U22.S-.1=S.1,U22.S-.0=S.0) = ADD17F1(
        U23.Q-.16=A.16,U23.Q-.15=A.15,U23.Q-.14=A.14,
        U23.Q-.13=A.13,U23.Q-.12=A.12,U23.Q-.11=A.11,
        U23.Q-.10=A.10,U23.Q-.9=A.9,U23.Q-.8=A.8,U23.Q-.7=A.7,
        U23.Q-.6=A.6,U23.Q-.5=A.5,U23.Q-.4=A.4,U23.Q-.3=A.3,
        U23.Q-.2=A.2,U23.Q-.1=A.1,U23.Q-.0=A.0,U19.Q-.16=B.16,
        U19.Q-.15=B.15,U19.Q-.14=B.14,U19.Q-.13=B.13,
        U19.Q-.12=B.12,U19.Q-.11=B.11,U19.Q-.10=B.10,U19.Q-.9=B.9,
        U19.Q-.8=B.8,U19.Q-.7=B.7,U19.Q-.6=B.6,U19.Q-.5=B.5,
        U19.Q-.4=B.4,U19.Q-.3=B.3,U19.Q-.2=B.2,U19.Q-.1=B.1,
        U19.Q-.0=B.0);
U21.17(U21.Q-.17=Q) = FD2SA(BRESET2_-=CD,CP-=CP,BWAIT2-=TE,
        U21.Q-.17=TI,U22.S-.17=D);
U21.16(U21.Q-.16=Q) = FD2SA(BRESET2_-=CD,CP-=CP,BWAIT2-=TE,
        U21.Q-.16=TI,U22.S-.16=D);
U21.15(U21.Q-.15=Q) = FD2SA(BRESET2_-=CD,CP-=CP,BWAIT2-=TE,
        U21.Q-.15=TI,U22.S-.15=D);
U21.14(U21.Q-.14=Q) = FD2SA(BRESET2_-=CD,CP-=CP,BWAIT2-=TE,
        U21.Q-.14=TI,U22.S-.14=D);
U21.13(U21.Q-.13=Q) = FD2SA(BRESET2_-=CD,CP-=CP,BWAIT2-=TE,
        U21.Q-.13=TI,U22.S-.13=D);
U21.12(U21.Q-.12=Q) = FD2SA(BRESET2_-=CD,CP-=CP,BWAIT2-=TE,
        U21.Q-.12=TI,U22.S-.12=D);
U21.11(U21.Q-.11=Q) = FD2SA(BRESET2_-=CD,CP-=CP,BWAIT2-=TE,
        U21.Q-.11=TI,U22.S-.11=D);
U21.10(U21.Q-.10=Q) = FD2SA(BRESET2_-=CD,CP-=CP,BWAIT2-=TE,
        U21.Q-.10=TI,U22.S-.10=D);
U21.9(U21.Q-.9=Q) = FD2SA(BRESET2_-=CD,CP-=CP,BWAIT2-=TE,
        U21.Q-.9=TI,U22.S-.9=D);
U21.8(U21.Q-.8=Q) = FD2SA(BRESET2_-=CD,CP-=CP,BWAIT2-=TE,
        U21.Q-.8=TI,U22.S-.8=D);
U21.7(U21.Q-.7=Q) = FD2SA(BRESET2_-=CD,CP-=CP,BWAIT2-=TE,
        U21.Q-.7=TI,U22.S-.7=D);
U21.6(U21.Q-.6=Q) = FD2SA(BRESET2_-=CD,CP-=CP,BWAIT2-=TE,
        U21.Q-.6=TI,U22.S-.6=D);
U21.5(U21.Q-.5=Q) = FD2SA(BRESET2_-=CD,CP-=CP,BWAIT2-=TE,
        U21.Q-.5=TI,U22.S-.5=D);
U21.4(U21.Q-.4=Q) = FD2SA(BRESET2_-=CD,CP-=CP,BWAIT2-=TE,
        U21.Q-.4=TI,U22.S-.4=D);
U21.3(U21.Q-.3=Q) = FD2SA(BRESET2_-=CD,CP-=CP,BWAIT2-=TE,
        U21.Q-.3=TI,U22.S-.3=D);
U21.2(U21.Q-.2=Q) = FD2SA(BRESET2_-=CD,CP-=CP,BWAIT2-=TE,
        U21.Q-.2=TI,U22.S-.2=D);
U21.1(U21.Q-.1=Q) = FD2SA(BRESET2_-=CD,CP-=CP,BWAIT2-=TE,
        U21.Q-.1=TI,U22.S-.1=D);
U21.0(U21.Q-.0=Q) = FD2SA(BRESET2_-=CD,CP-=CP,BWAIT2-=TE,
        U21.Q-.0=TI,U22.S-.0=D);
U4.12(U4.Q-.12=Q) = FD2SA(BRESET3_-=CD,CP-=CP,BWAIT0-=TE,
        U32.Z-.12=D,U4.Q-.12=TI);
U4.11(U4.Q-.11=Q) = FD2SA(BRESET3_-=CD,CP-=CP,BWAIT0-=TE,
        U32.Z-.11=D,U4.Q-.11=TI);
U4.10(U4.Q-.10=Q) = FD2SA(BRESET3_-=CD,CP-=CP,BWAIT0-=TE,
        U32.Z-.10=D,U4.Q-.10=TI);
```

```
U4.9(U4.Q-.9=Q) = FD2SA(BRESET3_-=CD,CP-=CP,BWAIT0-=TE,U32.Z-.9=D,
        U4.Q-.9=TI);
U4.8(U4.Q-.8=Q) = FD2SA(BRESET3_-=CD,CP-=CP,BWAIT0-=TE,U32.Z-.8=D,
        U4.Q-.8=TI);
U4.7(U4.Q-.7=Q) = FD2SA(BRESET3_-=CD,CP-=CP,BWAIT0-=TE,U32.Z-.7=D,
        U4.Q-.7=TI);
U4.6(U4.Q-.6=Q) = FD2SA(BRESET3_-=CD,CP-=CP,BWAIT0-=TE,U32.Z-.6=D,
        U4.Q-.6=TI);
U4.5(U4.Q-.5=Q) = FD2SA(BRESET3_-=CD,CP-=CP,BWAIT0-=TE,U32.Z-.5=D,
        U4.Q-.5=TI);
U4.4(U4.Q-.4=Q) = FD2SA(BRESET3_-=CD,CP-=CP,BWAIT0-=TE,U32.Z-.4=D,
        U4.Q-.4=TI);
U4.3(U4.Q-.3=Q) = FD2SA(BRESET3_-=CD,CP-=CP,BWAIT0-=TE,U32.Z-.3=D,
        U4.Q-.3=TI);
U4.2(U4.Q-.2=Q) = FD2SA(BRESET3_-=CD,CP-=CP,BWAIT0-=TE,U32.Z-.2=D,
        U4.Q-.2=TI);
U4.1(U4.Q-.1=Q) = FD2SA(BRESET3_-=CD,CP-=CP,BWAIT0-=TE,U32.Z-.1=D,
        U4.Q-.1=TI);
U4.0(U4.Q-.0=Q) = FD2SA(BRESET3_-=CD,CP-=CP,BWAIT0-=TE,U32.Z-.0=D,
        U4.Q-.0=TI);
U17(U17.S-.25=S.25,U17.S-.24=S.24,U17.S-.23=S.23,U17.S-.22=S.22,
        U17.S-.21=S.21,U17.S-.20=S.20,U17.S-.19=S.19,
        U17.S-.18=S.18,U17.S-.17=S.17,U17.S-.16=S.16,
        U17.S-.15=S.15,U17.S-.14=S.14,U17.S-.13=S.13,
        U17.S-.12=S.12,U17.S-.11=S.11,U17.S-.10=S.10,U17.S-.9=S.9,
        U17.S-.8=S.8,U17.S-.7=S.7,U17.S-.6=S.6,U17.S-.5=S.5,
        U17.S-.4=S.4,U17.S-.3=S.3,U17.S-.2=S.2,U17.S-.1=S.1,
        U17.S-.0=S.0) = DMB2120A(U17.TCX-=TCX,U17.TCYN-=TCYN,
        CD3-.11=Y.11,CD3-.10=Y.10,CD3-.9=Y.9,CD3-.8=Y.8,
        CD3-.7=Y.7,CD3-.6=Y.6,CD3-.5=Y.5,CD3-.4=Y.4,CD3-.3=Y.3,
        CD3-.2=Y.2,CD3-.1=Y.1,CD3-.0=Y.0,U4.Q-.12=X.12,
        U4.Q-.11=X.11,U4.Q-.10=X.10,U4.Q-.9=X.9,U4.Q-.8=X.8,
        U4.Q-.7=X.7,U4.Q-.6=X.6,U4.Q-.5=X.5,U4.Q-.4=X.4,
        U4.Q-.3=X.3,U4.Q-.2=X.2,U4.Q-.1=X.1,U4.Q-.0=X.0,
        U17.RND-=RND);
U29(U29.S-.25=S.25,U29.S-.24=S.24,U29.S-.23=S.23,U29.S-.22=S.22,
        U29.S-.21=S.21,U29.S-.20=S.20,U29.S-.19=S.19,
        U29.S-.18=S.18,U29.S-.17=S.17,U29.S-.16=S.16,
        U29.S-.15=S.15,U29.S-.14=S.14,U29.S-.13=S.13,
        U29.S-.12=S.12,U29.S-.11=S.11,U29.S-.10=S.10,U29.S-.9=S.9,
        U29.S-.8=S.8,U29.S-.7=S.7,U29.S-.6=S.6,U29.S-.5=S.5,
        U29.S-.4=S.4,U29.S-.3=S.3,U29.S-.2=S.2,U29.S-.1=S.1,
        U29.S-.0=S.0) = DMB2120A(U29.TCYN-=TCYN,U17.TCX-=TCX,
        CD1-.11=Y.11,CD1-.10=Y.10,CD1-.9=Y.9,CD1-.8=Y.8,
        CD1-.7=Y.7,CD1-.6=Y.6,CD1-.5=Y.5,CD1-.4=Y.4,CD1-.3=Y.3,
        CD1-.2=Y.2,CD1-.1=Y.1,CD1-.0=Y.0,U2.Q-.12=X.12,
        U2.Q-.11=X.11,U2.Q-.10=X.10,U2.Q-.9=X.9,U2.Q-.8=X.8,
        U2.Q-.7=X.7,U2.Q-.6=X.6,U2.Q-.5=X.5,U2.Q-.4=X.4,
        U2.Q-.3=X.3,U2.Q-.2=X.2,U2.Q-.1=X.1,U2.Q-.0=X.0,
        U29.RND-=RND);
U2.12(U2.Q-.12=Q) = FD2SA(BRESET1_-=CD,BWAIT0-=TE,CP-=CP,
        U34.Z-.12=D,U2.Q-.12=TI);
U2.11(U2.Q-.11=Q) = FD2SA(BRESET1_-=CD,BWAIT0-=TE,CP-=CP,
        U34.Z-.11=D,U2.Q-.11=TI);
U2.10(U2.Q-.10=Q) = FD2SA(BRESET1_-=CD,BWAIT0-=TE,CP-=CP,
        U34.Z-.10=D,U2.Q-.10=TI);
U2.9(U2.Q-.9=Q) = FD2SA(BRESET1_-=CD,BWAIT0-=TE,CP-=CP,U34.Z-.9=D,
        U2.Q-.9=TI);
U2.8(U2.Q-.8=Q) = FD2SA(BRESET1_-=CD,BWAIT0-=TE,CP-=CP,U34.Z-.8=D,
        U2.Q-.8=TI);
U2.7(U2.Q-.7=Q) = FD2SA(BRESET1_-=CD,BWAIT0-=TE,CP-=CP,U34.Z-.7=D,
        U2.Q-.7=TI);
U2.6(U2.Q-.6=Q) = FD2SA(BRESET1_-=CD,BWAIT0-=TE,CP-=CP,U34.Z-.6=D,
        U2.Q-.6=TI);
U2.5(U2.Q-.5=Q) = FD2SA(BRESET1_-=CD,BWAIT0-=TE,CP-=CP,U34.Z-.5=D,
        U2.Q-.5=TI);
U2.4(U2.Q-.4=Q) = FD2SA(BRESET1_-=CD,BWAIT0-=TE,CP-=CP,U34.Z-.4=D,
        U2.Q-.4=TI);
U2.3(U2.Q-.3=Q) = FD2SA(BRESET1_-=CD,BWAIT0-=TE,CP-=CP,U34.Z-.3=D,
        U2.Q-.3=TI);
U2.2(U2.Q-.2=Q) = FD2SA(BRESET1_-=CD,BWAIT0-=TE,CP-=CP,U34.Z-.2=D,
        U2.Q-.2=TI);
U2.1(U2.Q-.1=Q) = FD2SA(BRESET1_-=CD,BWAIT0-=TE,CP-=CP,U34.Z-.1=D,
        U2.Q-.1=TI);
U2.0(U2.Q-.0=Q) = FD2SA(BRESET1_-=CD,BWAIT0-=TE,CP-=CP,U34.Z-.0=D,
        U2.Q-.0=TI);
```

```
U34(U34.Z-.12=Z.12,U34.Z-.11=Z.11,U34.Z-.10=Z.10,U34.Z-.9=Z.9,
        U34.Z-.8=Z.8,U34.Z-.7=Z.7,U34.Z-.6=Z.6,U34.Z-.5=Z.5,
        U34.Z-.4=Z.4,U34.Z-.3=Z.3,U34.Z-.2=Z.2,U34.Z-.1=Z.1,
        U34.Z-.0=Z.0) = MUX2X1W13X8(U36.Q3-.12=D0.12,U36.Q3-.11=D0.11,
        U36.Q3-.10=D0.10,U36.Q3-.9=D0.9,U36.Q3-.8=D0.8,
        U36.Q3-.7=D0.7,U36.Q3-.6=D0.6,U36.Q3-.5=D0.5,
        U36.Q3-.4=D0.4,U36.Q3-.3=D0.3,U36.Q3-.2=D0.2,
        U36.Q3-.1=D0.1,U36.Q3-.0=D0.0,BS-=S,U31.D1-.7=D1.7,
        U31.D1-.6=D1.6,U31.D1-.5=D1.5,U31.D1-.4=D1.4,
        U31.D1-.3=D1.3,U31.D1-.2=D1.2,U31.D1-.1=D1.1,
        U31.D1-.0=D1.0);
U32(U32.Z-.12=Z.12,U32.Z-.11=Z.11,U32.Z-.10=Z.10,U32.Z-.9=Z.9,
        U32.Z-.8=Z.8,U32.Z-.7=Z.7,U32.Z-.6=Z.6,U32.Z-.5=Z.5,
        U32.Z-.4=Z.4,U32.Z-.3=Z.3,U32.Z-.2=Z.2,U32.Z-.1=Z.1,
        U32.Z-.0=Z.0) = MUX2X1W13X8(U36.Q1-.12=D0.12,U36.Q1-.11=D0.11,
        U36.Q1-.10=D0.10,U36.Q1-.9=D0.9,U36.Q1-.8=D0.8,
        U36.Q1-.7=D0.7,U36.Q1-.6=D0.6,U36.Q1-.5=D0.5,
        U36.Q1-.4=D0.4,U36.Q1-.3=D0.3,U36.Q1-.2=D0.2,
        U36.Q1-.1=D0.1,U36.Q1-.0=D0.0,BS-=S,U31.D3-.7=D1.7,
        U31.D3-.6=D1.6,U31.D3-.5=D1.5,U31.D3-.4=D1.4,
        U31.D3-.3=D1.3,U31.D3-.2=D1.2,U31.D3-.1=D1.1,
        U31.D3-.0=D1.0);
U31(U31.D0-.7=D0.7,U31.D0-.6=D0.6,U31.D0-.5=D0.5,U31.D0-.4=D0.4,
        U31.D0-.3=D0.3,U31.D0-.2=D0.2,U31.D0-.1=D0.1,
        U31.D0-.0=D0.0,U31.D1-.7=D1.7,U31.D1-.6=D1.6,
        U31.D1-.5=D1.5,U31.D1-.4=D1.4,U31.D1-.3=D1.3,
        U31.D1-.2=D1.2,U31.D1-.1=D1.1,U31.D1-.0=D1.0,
        U31.D2-.7=D2.7,U31.D2-.6=D2.6,U31.D2-.5=D2.5,
        U31.D2-.4=D2.4,U31.D2-.3=D2.3,U31.D2-.2=D2.2,
        U31.D2-.1=D2.1,U31.D2-.0=D2.0,U31.D4-.7=D4.7,
        U31.D4-.6=D4.6,U31.D4-.5=D4.5,U31.D4-.4=D4.4,
        U31.D4-.3=D4.3,U31.D4-.2=D4.2,U31.D4-.1=D4.1,
        U31.D4-.0=D4.0,U31.D3-.7=D3.7,U31.D3-.6=D3.6,
        U31.D3-.5=D3.5,U31.D3-.4=D3.4,U31.D3-.3=D3.3,
        U31.D3-.2=D3.2,U31.D3-.1=D3.1,U31.D3-.0=D3.0) =
        INP_MUX(BRESET3_-=RESET_,CP-=CP,BWAIT4-=WAIT,LST_ROW-=LAST_ROW,
        LST_ROW_1-=LAST_MINUS1,SCND_ROW-=SECOND_ROW,FRST_ROW-=FIRST_ROW,
        ROW_ORDR-.2=ROW_ORDR.2,ROW_ORDR-.1=ROW_ORDR.1,
        ROW_ORDR-.0=ROW_ORDR.0,STB_I-=STB_I,RC4-.7=RC4.7,
        RC4-.6=RC4.6,RC4-.5=RC4.5,RC4-.4=RC4.4,RC4-.3=RC4.3,
        RC4-.2=RC4.2,RC4-.1=RC4.1,RC4-.0=RC4.0,RC3-.7=RC3.7,
        RC3-.6=RC3.6,RC3-.5=RC3.5,RC3-.4=RC3.4,RC3-.3=RC3.3,
        RC3-.2=RC3.2,RC3-.1=RC3.1,RC3-.0=RC3.0,RC2-.7=RC2.7,
        RC2-.6=RC2.6,RC2-.5=RC2.5,RC2-.4=RC2.4,RC2-.3=RC2.3,
        RC2-.2=RC2.2,RC2-.1=RC2.1,RC2-.0=RC2.0,RC1-.7=RC1.7,
        RC1-.6=RC1.6,RC1-.5=RC1.5,RC1-.4=RC1.4,RC1-.3=RC1.3,
        RC1-.2=RC1.2,RC1-.1=RC1.1,RC1-.0=RC1.0,RC0-.7=RC0.7,
        RC0-.6=RC0.6,RC0-.5=RC0.5,RC0-.4=RC0.4,RC0-.3=RC0.3,
        RC0-.2=RC0.2,RC0-.1=RC0.1,RC0-.0=RC0.0,S_MODE-=S_MODE);


/* extractors ******************************/

  U29.S-.24 = (U25.D-.15);
  U29.S-.23 = (U25.D-.14);
  U29.S-.22 = (U25.D-.13);
  U29.S-.21 = (U25.D-.12);
  U29.S-.20 = (U25.D-.11);
  U29.S-.19 = (U25.D-.10);
  U29.S-.18 = (U25.D-.9);
  U29.S-.17 = (U25.D-.8);
  U29.S-.16 = (U25.D-.7);
  U29.S-.15 = (U25.D-.6);
  U29.S-.14 = (U25.D-.5);
  U29.S-.13 = (U25.D-.4);
  U29.S-.12 = (U25.D-.3);
  U29.S-.11 = (U25.D-.2);
  U29.S-.10 = (U25.D-.1);
  U29.S-.9 = (U25.D-.0);
  U10.Z-.4 = (BWAIT4-);
  U16.S-.24 = (U14.D-.15);
  U16.S-.23 = (U14.D-.14);
  U16.S-.22 = (U14.D-.13);
  U16.S-.21 = (U14.D-.12);
```

```
U16.S-.20 = (U14.D-.11);
U16.S-.19 = (U14.D-.10);
U16.S-.18 = (U14.D-.9);
U16.S-.17 = (U14.D-.8);
U16.S-.16 = (U14.D-.7);
U16.S-.15 = (U14.D-.6);
U16.S-.14 = (U14.D-.5);
U16.S-.13 = (U14.D-.4);
U16.S-.12 = (U14.D-.3);
U16.S-.11 = (U14.D-.2);
U16.S-.10 = (U14.D-.1);
U16.S-.9 = (U14.D-.0);
U10.Z-.3 = (BWAIT3-);
U18.S-.15 = (U0.D-.12);
U18.S-.14 = (U0.D-.11);
U18.S-.13 = (U0.D-.10);
U18.S-.12 = (U0.D-.9);
U18.S-.11 = (U0.D-.8);
U18.S-.10 = (U0.D-.7);
U18.S-.9 = (U0.D-.6);
U18.S-.8 = (U0.D-.5);
U18.S-.7 = (U0.D-.4);
U18.S-.6 = (U0.D-.3);
U18.S-.5 = (U0.D-.2);
U18.S-.4 = (U0.D-.1);
U18.S-.3 = (U0.D-.0);
U21.Q-.17 = (U38.D2-.15);
U21.Q-.16 = (U38.D2-.14);
U21.Q-.15 = (U38.D2-.13);
U21.Q-.14 = (U38.D2-.12);
U21.Q-.13 = (U38.D2-.11);
U21.Q-.12 = (U38.D2-.10);
U21.Q-.11 = (U38.D2-.9);
U21.Q-.10 = (U38.D2-.8);
U21.Q-.9 = (U38.D2-.7);
U21.Q-.8 = (U38.D2-.6);
U21.Q-.7 = (U38.D2-.5);
U21.Q-.6 = (U38.D2-.4);
U21.Q-.5 = (U38.D2-.3);
U21.Q-.4 = (U38.D2-.2);
U21.Q-.3 = (U38.D2-.1);
U21.Q-.2 = (U38.D2-.0);
U17.S-.24 = (U15.D-.15);
U17.S-.23 = (U15.D-.14);
U17.S-.22 = (U15.D-.13);
U17.S-.21 = (U15.D-.12);
U17.S-.20 = (U15.D-.11);
U17.S-.19 = (U15.D-.10);
U17.S-.18 = (U15.D-.9);
U17.S-.17 = (U15.D-.8);
U17.S-.16 = (U15.D-.7);
U17.S-.15 = (U15.D-.6);
U17.S-.14 = (U15.D-.5);
U17.S-.13 = (U15.D-.4);
U17.S-.12 = (U15.D-.3);
U17.S-.11 = (U15.D-.2);
U17.S-.10 = (U15.D-.1);
U17.S-.9 = (U15.D-.0);
U28.S-.24 = (U24.D-.15);
U28.S-.23 = (U24.D-.14);
U28.S-.22 = (U24.D-.13);
U28.S-.21 = (U24.D-.12);
U28.S-.20 = (U24.D-.11);
U28.S-.19 = (U24.D-.10);
U28.S-.18 = (U24.D-.9);
U28.S-.17 = (U24.D-.8);
U28.S-.16 = (U24.D-.7);
U28.S-.15 = (U24.D-.6);
U28.S-.14 = (U24.D-.5);
U28.S-.13 = (U24.D-.4);
U28.S-.12 = (U24.D-.3);
U28.S-.11 = (U24.D-.2);
U28.S-.10 = (U24.D-.1);
U28.S-.9 = (U24.D-.0);
```

```
U20.S-.16 = (U38.D0-.15);
U20.S-.15 = (U38.D0-.14);
U20.S-.14 = (U38.D0-.13);
U20.S-.13 = (U38.D0-.12);
U20.S-.12 = (U38.D0-.11);
U20.S-.11 = (U38.D0-.10);
U20.S-.10 = (U38.D0-.9);
U20.S-.9 = (U38.D0-.8);
U20.S-.8 = (U38.D0-.7);
U20.S-.7 = (U38.D0-.6);
U20.S-.6 = (U38.D0-.5);
U20.S-.5 = (U38.D0-.4);
U20.S-.4 = (U38.D0-.3);
U20.S-.3 = (U38.D0-.2);
U20.S-.2 = (U38.D0-.1);
U20.S-.1 = (U38.D0-.0);
U10.Z-.1 = (BWAIT1-);
U30.S-.24 = (U27.D-.15);
U30.S-.23 = (U27.D-.14);
U30.S-.22 = (U27.D-.13);
U30.S-.21 = (U27.D-.12);
U30.S-.20 = (U27.D-.11);
U30.S-.19 = (U27.D-.10);
U30.S-.18 = (U27.D-.9);
U30.S-.17 = (U27.D-.8);
U30.S-.16 = (U27.D-.7);
U30.S-.15 = (U27.D-.6);
U30.S-.14 = (U27.D-.5);
U30.S-.13 = (U27.D-.4);
U30.S-.12 = (U27.D-.3);
U30.S-.11 = (U27.D-.2);
U30.S-.10 = (U27.D-.1);
U30.S-.9 = (U27.D-.0);
U18.B-.15 = (U12.Q-.15);
U18.B-.14 = (U12.Q-.14);
U18.B-.13 = (U12.Q-.13);
U18.B-.12 = (U12.Q-.12);
U18.B-.11 = (U12.Q-.11);
U18.B-.10 = (U12.Q-.10);
U18.B-.9 = (U12.Q-.9);
U18.B-.8 = (U12.Q-.8);
U18.B-.7 = (U12.Q-.7);
U18.B-.6 = (U12.Q-.6);
U18.B-.5 = (U12.Q-.5);
U18.B-.4 = (U12.Q-.4);
U18.B-.3 = (U12.Q-.3);
U18.B-.2 = (U12.Q-.2);
U18.B-.1 = (U12.Q-.1);
U18.B-.0 = (U12.Q-.0);
U18.B-.17 = (M-0);
U18.B-.16 = (M-0);
U18.B-.17 = (U38.D3-.15);
U18.B-.16 = (U38.D3-.14);
U18.B-.15 = (U38.D3-.13);
U18.B-.14 = (U38.D3-.12);
U18.B-.13 = (U38.D3-.11);
U18.B-.12 = (U38.D3-.10);
U18.B-.11 = (U38.D3-.9);
U18.B-.10 = (U38.D3-.8);
U18.B-.9 = (U38.D3-.7);
U18.B-.8 = (U38.D3-.6);
U18.B-.7 = (U38.D3-.5);
U18.B-.6 = (U38.D3-.4);
U18.B-.5 = (U38.D3-.3);
U18.B-.4 = (U38.D3-.2);
U18.B-.3 = (U38.D3-.1);
U18.B-.2 = (U38.D3-.0);
U26.S-.16 = (U38.D1-.15);
U26.S-.15 = (U38.D1-.14);
U26.S-.14 = (U38.D1-.13);
U26.S-.13 = (U38.D1-.12);
U26.S-.12 = (U38.D1-.11);
U26.S-.11 = (U38.D1-.10);
U26.S-.10 = (U38.D1-.9);
U26.S-.9 = (U38.D1-.8);
```

```
    U26.S-.8 = (U38.D1-.7);
    U26.S-.7 = (U38.D1-.6);
    U26.S-.6 = (U38.D1-.5);
    U26.S-.5 = (U38.D1-.4);
    U26.S-.4 = (U38.D1-.3);
    U26.S-.3 = (U38.D1-.2);
    U26.S-.2 = (U38.D1-.1);
    U26.S-.1 = (U38.D1-.0);
    U10.Z-.2 = (BWAIT2-);
    U10.Z-.0 = (BWAIT0-);

  /* type converters *********************/
ANNOTATIONS
{
  BUS BUS_TYPE = "DOT";
}

END MODULE;


/* * * * * * *  Contents of NET file REG23.NET  * * * * * * */

/*******************************************************/
/*  Netlist copyright (C) 1989 LSI Logic Corporation  */
/*******************************************************/


MODULE REG23;

INPUTS      CP,DH_CS_,DL_CS_,PDI.15,PDI.14,PDI.13,PDI.12,PDI.11,
            PDI.10,PDI.9,PDI.8,PDI.7,PDI.6,PDI.5,PDI.4,PDI.3,
            PDI.2,PDI.1,PDI.0,RESET_,SCNIN,TEST;
OUTPUTS     Q.22,Q.21,Q.20,Q.19,Q.18,Q.17,Q.16,Q.15,Q.14,Q.13,
            Q.12,Q.11,Q.10,Q.9,Q.8,Q.7,Q.6,Q.5,Q.4,Q.3,Q.2,Q.1,
            Q.0,SCNOUT;

LEVEL FUNCTION;
DEFINE
  /* implicit connectors *******************/

    CP- = (CP);
    RESET_- = (RESET_);
    BRESET_- = (BRESET_);
    TEST- = (TEST);
    PDI-.15 = (PDI.15);
    PDI-.14 = (PDI.14);
    PDI-.13 = (PDI.13);
    PDI-.12 = (PDI.12);
    PDI-.11 = (PDI.11);
    PDI-.10 = (PDI.10);
    PDI-.9 = (PDI.9);
    PDI-.8 = (PDI.8);
    PDI-.7 = (PDI.7);
    PDI-.6 = (PDI.6);
    PDI-.5 = (PDI.5);
    PDI-.4 = (PDI.4);
    PDI-.3 = (PDI.3);
    PDI-.2 = (PDI.2);
    PDI-.1 = (PDI.1);
    PDI-.0 = (PDI.0);
    SCNIN- = (SCNIN);
    SCNOUT- = (SCNOUT);
    Q-.22 = (Q.22);
    Q-.21 = (Q.21);
    Q-.20 = (Q.20);
    Q-.19 = (Q.19);
    Q-.18 = (Q.18);
    Q-.17 = (Q.17);
    Q-.16 = (Q.16);
    Q-.15 = (Q.15);
    Q-.14 = (Q.14);
    Q-.13 = (Q.13);
```

```
  Q-.12 = (Q.12);
  Q-.11 = (Q.11);
  Q-.10 = (Q.10);
  Q-.9 = (Q.9);
  Q-.8 = (Q.8);
  Q-.7 = (Q.7);
  Q-.6 = (Q.6);
  Q-.5 = (Q.5);
  Q-.4 = (Q.4);
  Q-.3 = (Q.3);
  Q-.2 = (Q.2);
  Q-.1 = (Q.1);
  Q-.0 = (Q.0);
  BRESET_- = (BRESET_);
  BRESET_- = (BRESET_);
  DH_CS_- = (DH_CS_);
  DL_CS_- = (DL_CS_);


/* part instances **************************/

  U6(U6.Z-=Z) = N1A(RESET_-=A);
  U5(BRESET_-=Z) = N1C(U6.Z-=A);
  U0.15(U0.Q-.15=Q) = FD2SA(BRESET_-=CD,TEST-=TE,U2.Z-=CP,PDI-.15=D,
          U0.TI-.15=TI);
  U0.14(U0.Q-.14=Q) = FD2SA(BRESET_-=CD,TEST-=TE,U2.Z-=CP,PDI-.14=D,
          U0.TI-.14=TI);
  U0.13(U0.Q-.13=Q) = FD2SA(BRESET_-=CD,TEST-=TE,U2.Z-=CP,PDI-.13=D,
          U0.TI-.13=TI);
  U0.12(U0.Q-.12=Q) = FD2SA(BRESET_-=CD,TEST-=TE,U2.Z-=CP,PDI-.12=D,
          U0.TI-.12=TI);
  U0.11(U0.Q-.11=Q) = FD2SA(BRESET_-=CD,TEST-=TE,U2.Z-=CP,PDI-.11=D,
          U0.TI-.11=TI);
  U0.10(U0.Q-.10=Q) = FD2SA(BRESET_-=CD,TEST-=TE,U2.Z-=CP,PDI-.10=D,
          U0.TI-.10=TI);
  U0.9(U0.Q-.9=Q) = FD2SA(BRESET_-=CD,TEST-=TE,U2.Z-=CP,PDI-.9=D,
          U0.TI-.9=TI);
  U0.8(U0.Q-.8=Q) = FD2SA(BRESET_-=CD,TEST-=TE,U2.Z-=CP,PDI-.8=D,
          U0.TI-.8=TI);
  U0.7(U0.Q-.7=Q) = FD2SA(BRESET_-=CD,TEST-=TE,U2.Z-=CP,PDI-.7=D,
          U0.TI-.7=TI);
  U0.6(U0.Q-.6=Q) = FD2SA(BRESET_-=CD,TEST-=TE,U2.Z-=CP,PDI-.6=D,
          U0.TI-.6=TI);
  U0.5(U0.Q-.5=Q) = FD2SA(BRESET_-=CD,TEST-=TE,U2.Z-=CP,PDI-.5=D,
          U0.TI-.5=TI);
  U0.4(U0.Q-.4=Q) = FD2SA(BRESET_-=CD,TEST-=TE,U2.Z-=CP,PDI-.4=D,
          U0.TI-.4=TI);
  U0.3(U0.Q-.3=Q) = FD2SA(BRESET_-=CD,TEST-=TE,U2.Z-=CP,PDI-.3=D,
          U0.TI-.3=TI);
  U0.2(U0.Q-.2=Q) = FD2SA(BRESET_-=CD,TEST-=TE,U2.Z-=CP,PDI-.2=D,
          U0.TI-.2=TI);
  U0.1(U0.Q-.1=Q) = FD2SA(BRESET_-=CD,TEST-=TE,U2.Z-=CP,PDI-.1=D,
          U0.TI-.1=TI);
  U0.0(U0.Q-.0=Q) = FD2SA(BRESET_-=CD,TEST-=TE,U2.Z-=CP,PDI-.0=D,
          U0.TI-.0=TI);
  U1.6(U1.Q-.6=Q) = FD2SA(U1.TI-.6=TI,U1.D-.6=D,U3.Z-=CP,TEST-=TE,
          BRESET_-=CD);
  U1.5(U1.Q-.5=Q) = FD2SA(U1.TI-.5=TI,U1.D-.5=D,U3.Z-=CP,TEST-=TE,
          BRESET_-=CD);
  U1.4(U1.Q-.4=Q) = FD2SA(U1.TI-.4=TI,U1.D-.4=D,U3.Z-=CP,TEST-=TE,
          BRESET_-=CD);
  U1.3(U1.Q-.3=Q) = FD2SA(U1.TI-.3=TI,U1.D-.3=D,U3.Z-=CP,TEST-=TE,
          BRESET_-=CD);
  U1.2(U1.Q-.2=Q) = FD2SA(U1.TI-.2=TI,U1.D-.2=D,U3.Z-=CP,TEST-=TE,
          BRESET_-=CD);
  U1.1(U1.Q-.1=Q) = FD2SA(U1.TI-.1=TI,U1.D-.1=D,U3.Z-=CP,TEST-=TE,
          BRESET_-=CD);
  U1.0(U1.Q-.0=Q) = FD2SA(U1.TI-.0=TI,U1.D-.0=D,U3.Z-=CP,TEST-=TE,
          BRESET_-=CD);
  U3(U3.Z-=Z) = OR2B(CP-=B,DH_CS_-=A);
  U2(U2.Z-=Z) = OR2B(CP-=A,DL_CS_-=B);
```

```
/* extractors ******************************/

  PDI-.6 = (U1.D-.6);
  PDI-.5 = (U1.D-.5);
  PDI-.4 = (U1.D-.4);
  PDI-.3 = (U1.D-.3);
  PDI-.2 = (U1.D-.2);
  PDI-.1 = (U1.D-.1);
  PDI-.0 = (U1.D-.0);
  U1.TI-.0 = (SCNIN-);
  U1.TI-.6 = (M-0.5);
  U1.TI-.5 = (M-0.4);
  U1.TI-.4 = (M-0.3);
  U1.TI-.3 = (M-0.2);
  U1.TI-.2 = (M-0.1);
  U1.TI-.1 = (M-0.0);
  U1.Q-.5 = (M-0.5);
  U1.Q-.4 = (M-0.4);
  U1.Q-.3 = (M-0.3);
  U1.Q-.2 = (M-0.2);
  U1.Q-.1 = (M-0.1);
  U1.Q-.0 = (M-0.0);
  U0.Q-.15 = (SCNOUT-);
  U0.TI-.15 = (M-1.14);
  U0.TI-.14 = (M-1.13);
  U0.TI-.13 = (M-1.12);
  U0.TI-.12 = (M-1.11);
  U0.TI-.11 = (M-1.10);
  U0.TI-.10 = (M-1.9);
  U0.TI-.9 = (M-1.8);
  U0.TI-.8 = (M-1.7);
  U0.TI-.7 = (M-1.6);
  U0.TI-.6 = (M-1.5);
  U0.TI-.5 = (M-1.4);
  U0.TI-.4 = (M-1.3);
  U0.TI-.3 = (M-1.2);
  U0.TI-.2 = (M-1.1);
  U0.TI-.1 = (M-1.0);
  U0.Q-.14 = (M-1.14);
  U0.Q-.13 = (M-1.13);
  U0.Q-.12 = (M-1.12);
  U0.Q-.11 = (M-1.11);
  U0.Q-.10 = (M-1.10);
  U0.Q-.9 = (M-1.9);
  U0.Q-.8 = (M-1.8);
  U0.Q-.7 = (M-1.7);
  U0.Q-.6 = (M-1.6);
  U0.Q-.5 = (M-1.5);
  U0.Q-.4 = (M-1.4);
  U0.Q-.3 = (M-1.3);
  U0.Q-.2 = (M-1.2);
  U0.Q-.1 = (M-1.1);
  U0.Q-.0 = (M-1.0);
  Q-.15 = (U0.Q-.15);
  Q-.14 = (U0.Q-.14);
  Q-.13 = (U0.Q-.13);
  Q-.12 = (U0.Q-.12);
  Q-.11 = (U0.Q-.11);
  Q-.10 = (U0.Q-.10);
  Q-.9 = (U0.Q-.9);
  Q-.8 = (U0.Q-.8);
  Q-.7 = (U0.Q-.7);
  Q-.6 = (U0.Q-.6);
  Q-.5 = (U0.Q-.5);
  Q-.4 = (U0.Q-.4);
  Q-.3 = (U0.Q-.3);
  Q-.2 = (U0.Q-.2);
  Q-.1 = (U0.Q-.1);
  Q-.0 = (U0.Q-.0);
  Q-.22 = (U1.Q-.6);
  Q-.21 = (U1.Q-.5);
  Q-.20 = (U1.Q-.4);
  Q-.19 = (U1.Q-.3);
  Q-.18 = (U1.Q-.2);
```

```
    Q-.17 = (U1.Q-.1);
    Q-.16 = (U1.Q-.0);
    U1.Q-.6 = (M-2);
    U0.TI-.0 = (M-2);

  /* type converters *********************/

ANNOTATIONS
{
  BUS BUS_TYPE = "DOT";
}

END MODULE;


/* * * * * * *  Contents of NET file MUX2X1W23.NET  * * * * * * */

/*******************************************************/
/*  Netlist copyright (C) 1989 LSI Logic Corporation  */
/*******************************************************/


MODULE MUX2X1W23;

INPUTS      A.22,A.21,A.20,A.19,A.18,A.17,A.16,A.15,A.14,A.13,
            A.12,A.11,A.10,A.9,A.8,A.7,A.6,A.5,A.4,A.3,A.2,A.1,
            A.0,B.22,B.21,B.20,B.19,B.18,B.17,B.16,B.15,B.14,B.13,
            B.12,B.11,B.10,B.9,B.8,B.7,B.6,B.5,B.4,B.3,B.2,B.1,
            B.0,S;
OUTPUTS     Z.22,Z.21,Z.20,Z.19,Z.18,Z.17,Z.16,Z.15,Z.14,Z.13,
            Z.12,Z.11,Z.10,Z.9,Z.8,Z.7,Z.6,Z.5,Z.4,Z.3,Z.2,Z.1,
            Z.0;

LEVEL FUNCTION;
DEFINE
  /* implicit connectors *******************/

    A-.22 = (A.22);
    A-.21 = (A.21);
    A-.20 = (A.20);
    A-.19 = (A.19);
    A-.18 = (A.18);
    A-.17 = (A.17);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
    A-.1 = (A.1);
    A-.0 = (A.0);
    B-.22 = (B.22);
    B-.21 = (B.21);
    B-.20 = (B.20);
    B-.19 = (B.19);
    B-.18 = (B.18);
    B-.17 = (B.17);
    B-.16 = (B.16);
    B-.15 = (B.15);
    B-.14 = (B.14);
    B-.13 = (B.13);
    B-.12 = (B.12);
    B-.11 = (B.11);
    B-.10 = (B.10);
```

```
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);
S- = (S);
Z-.22 = (Z.22);
Z-.21 = (Z.21);
Z-.20 = (Z.20);
Z-.19 = (Z.19);
Z-.18 = (Z.18);
Z-.17 = (Z.17);
Z-.16 = (Z.16);
Z-.15 = (Z.15);
Z-.14 = (Z.14);
Z-.13 = (Z.13);
Z-.12 = (Z.12);
Z-.11 = (Z.11);
Z-.10 = (Z.10);
Z-.9 = (Z.9);
Z-.8 = (Z.8);
Z-.7 = (Z.7);
Z-.6 = (Z.6);
Z-.5 = (Z.5);
Z-.4 = (Z.4);
Z-.3 = (Z.3);
Z-.2 = (Z.2);
Z-.1 = (Z.1);
Z-.0 = (Z.0);


/* part instances **************************/
U2(U2.Z-=Z) = N1D(S-=A);
U0.22(U0.Z-.22=Z) = MX21LC(A-.22=A,B-.22=B,U2.Z-=S);
U0.21(U0.Z-.21=Z) = MX21LC(A-.21=A,B-.21=B,U2.Z-=S);
U0.20(U0.Z-.20=Z) = MX21LC(A-.20=A,B-.20=B,U2.Z-=S);
U0.19(U0.Z-.19=Z) = MX21LC(A-.19=A,B-.19=B,U2.Z-=S);
U0.18(U0.Z-.18=Z) = MX21LC(A-.18=A,B-.18=B,U2.Z-=S);
U0.17(U0.Z-.17=Z) = MX21LC(A-.17=A,B-.17=B,U2.Z-=S);
U0.16(U0.Z-.16=Z) = MX21LC(A-.16=A,B-.16=B,U2.Z-=S);
U0.15(U0.Z-.15=Z) = MX21LC(A-.15=A,B-.15=B,U2.Z-=S);
U0.14(U0.Z-.14=Z) = MX21LC(A-.14=A,B-.14=B,U2.Z-=S);
U0.13(U0.Z-.13=Z) = MX21LC(A-.13=A,B-.13=B,U2.Z-=S);
U0.12(U0.Z-.12=Z) = MX21LC(A-.12=A,B-.12=B,U2.Z-=S);
U0.11(U0.Z-.11=Z) = MX21LC(A-.11=A,B-.11=B,U2.Z-=S);
U0.10(U0.Z-.10=Z) = MX21LC(A-.10=A,B-.10=B,U2.Z-=S);
U0.9(U0.Z-.9=Z) = MX21LC(A-.9=A,B-.9=B,U2.Z-=S);
U0.8(U0.Z-.8=Z) = MX21LC(A-.8=A,B-.8=B,U2.Z-=S);
U0.7(U0.Z-.7=Z) = MX21LC(A-.7=A,B-.7=B,U2.Z-=S);
U0.6(U0.Z-.6=Z) = MX21LC(A-.6=A,B-.6=B,U2.Z-=S);
U0.5(U0.Z-.5=Z) = MX21LC(A-.5=A,B-.5=B,U2.Z-=S);
U0.4(U0.Z-.4=Z) = MX21LC(A-.4=A,B-.4=B,U2.Z-=S);
U0.3(U0.Z-.3=Z) = MX21LC(A-.3=A,B-.3=B,U2.Z-=S);
U0.2(U0.Z-.2=Z) = MX21LC(A-.2=A,B-.2=B,U2.Z-=S);
U0.1(U0.Z-.1=Z) = MX21LC(A-.1=A,B-.1=B,U2.Z-=S);
U0.0(U0.Z-.0=Z) = MX21LC(A-.0=A,B-.0=B,U2.Z-=S);
U1.22(Z-.22=Z) = N1D(U0.Z-.22=A);
U1.21(Z-.21=Z) = N1D(U0.Z-.21=A);
U1.20(Z-.20=Z) = N1D(U0.Z-.20=A);
U1.19(Z-.19=Z) = N1D(U0.Z-.19=A);
U1.18(Z-.18=Z) = N1D(U0.Z-.18=A);
U1.17(Z-.17=Z) = N1D(U0.Z-.17=A);
U1.16(Z-.16=Z) = N1D(U0.Z-.16=A);
U1.15(Z-.15=Z) = N1D(U0.Z-.15=A);
U1.14(Z-.14=Z) = N1D(U0.Z-.14=A);
U1.13(Z-.13=Z) = N1D(U0.Z-.13=A);
U1.12(Z-.12=Z) = N1D(U0.Z-.12=A);
U1.11(Z-.11=Z) = N1D(U0.Z-.11=A);
U1.10(Z-.10=Z) = N1D(U0.Z-.10=A);
```

```
    U1.9(Z-.9=Z) = N1D(U0.Z-.9=A);
    U1.8(Z-.8=Z) = N1D(U0.Z-.8=A);
    U1.7(Z-.7=Z) = N1D(U0.Z-.7=A);
    U1.6(Z-.6=Z) = N1D(U0.Z-.6=A);
    U1.5(Z-.5=Z) = N1D(U0.Z-.5=A);
    U1.4(Z-.4=Z) = N1D(U0.Z-.4=A);
    U1.3(Z-.3=Z) = N1D(U0.Z-.3=A);
    U1.2(Z-.2=Z) = N1D(U0.Z-.2=A);
    U1.1(Z-.1=Z) = N1D(U0.Z-.1=A);
    U1.0(Z-.0=Z) = N1D(U0.Z-.0=A);


  /* extractors ******************************/


  /* type converters *********************/

ANNOTATIONS
{
  BUS BUS_TYPE = "DOT";
}

END MODULE;

/* * * * * * *  Contents of NET file ADD23F0_SEL4.NET  * * * * * * */

/*******************************************************/
/*  Netlist copyright (C) 1989 LSI Logic Corporation   */
/*******************************************************/


MODULE ADD23F0_SEL4;

INPUTS      A0,A1,A2,A3,B0,B1,B2,B3;
OUTPUTS     G,SUM0,SUM1,SUM2,SUM3;

LEVEL FUNCTION;
DEFINE
  /* implicit connectors *******************/

    B3- = (B3);
    A3- = (A3);
    A1- = (A1);
    B1- = (B1);
    SUM0- = (SUM0);
    A0- = (A0);
    B0- = (B0);
    SUM1- = (SUM1);
    G- = (G);
    SUM2- = (SUM2);
    SUM3- = (SUM3);
    A2- = (A2);
    B2- = (B2);


  /* part instances **************************/

    M___15(M___15.Z-=Z) = NR2C(A3-=A,B3-=B);
    M___14(M___14.Z-=Z) = ND2C(B3-=B,A3-=A);
    M___16(M___16.Z-=Z) = N1B(M___15.Z-=A);
    M___3(M___3.Z-=Z) = ND2C(B1-=B,A1-=A);
    M___4(M___4.Z-=Z) = NR2C(A1-=A,B1-=B);
    M___7(M___7.Z-=Z) = N1B(M___4.Z-=A);
    M___38(SUM0-=Z) = N1C(M___29.Z-=A);
    M___1(M___1.Z-=Z) = ND2C(B0-=B,A0-=A);
    M___2(M___2.Z-=Z) = NR2C(A0-=A,B0-=B);
    M___9(M___9.Z-=Z) = N1B(M___2.Z-=A);
    M___29(M___29.Z-=Z) = ND2B(M___9.Z-=B,M___1.Z-=A);
    M___39(SUM1-=Z) = N1C(M___31.Z-=A);
    M___31(M___31.Z-=Z) = ENB(M___1.Z-=A,M___8.Z-=B);
    M___8(M___8.Z-=Z) = ND2B(M___7.Z-=B,M___3.Z-=A);
    M___10(M___10.Z-=Z) = AO7B(M___1.Z-=A,M___4.Z-=B,M___3.Z-=C);
    M___22(M___22.Z-=Z) = N1C(M___19.Z-=A);
```

```
    M___43(G-=Z) = ND2C(M___21.Z-=A,M___22.Z-=B);
    M___21(M___21.Z-=Z) = ND2B(M___10.Z-=B,M___20.Z-=A);
    M___26(M___26.Z-=Z) = N1B(M___25.Z-=A);
    M___40(SUM2-=Z) = N1C(M___33.Z-=A);
    M___33(M___33.Z-=Z) = MX21LA(M___10.Z-=S,M___26.Z-=A,M___25.Z-=B);
    M___18(M___18.Z-=Z) = N1B(M___13.Z-=A);
    M___25(M___25.Z-=Z) = ND2B(M___18.Z-=B,M___12.Z-=A);
    M___27(M___27.Z-=Z) = EOB(M___12.Z-=A,M___17.Z-=B);
    M___41(SUM3-=Z) = N1C(M___35.Z-=A);
    M___35(M___35.Z-=Z) = MX21LA(M___10.Z-=S,M___28.Z-=B,M___27.Z-=A);
    M___28(M___28.Z-=Z) = ENB(M___17.Z-=A,M___18.Z-=B);
    M___17(M___17.Z-=Z) = ND2C(M___16.Z-=B,M___14.Z-=A);
    M___19(M___19.Z-=Z) = AO7A(M___15.Z-=B,M___12.Z-=A,M___14.Z-=C);
    M___20(M___20.Z-=Z) = NR2C(M___15.Z-=B,M___13.Z-=A);
    M___13(M___13.Z-=Z) = NR2C(A2-=A,B2-=B);
    M___12(M___12.Z-=Z) = ND2C(B2-=B,A2-=A);

  /* extractors ******************************/


  /* type converters *********************/

ANNOTATIONS
{
  BUS BUS_TYPE = "DOT";
}

END MODULE;


/* * * * * * *  Contents of NET file ADD23F_SEL3.NET  * * * * * * */

/*******************************************************/
/*  Netlist copyright (C) 1989 LSI Logic Corporation  */
/*******************************************************/


MODULE ADD23F_SEL3;

INPUTS      A0,A1,A2,B0,B1,B2,CI;
OUTPUTS     SUM0,SUM1,SUM2;

LEVEL FUNCTION;
DEFINE
  /* implicit connectors ******************/

    SUM1- = (SUM1);
    CI- = (CI);
    SUM0- = (SUM0);
    B2- = (B2);
    A2- = (A2);
    B1- = (B1);
    A1- = (A1);
    A0- = (A0);
    B0- = (B0);
    SUM2- = (SUM2);

  /* part instances **************************/

    M___37(M___37.Z-=Z) = N1D(CI-=A);
    M___30(M___30.Z-=Z) = N1C(M___29.Z-=A);
    M___38(SUM0-=Z) = MX21LB(M___29.Z-=B,M___37.Z-=S,M___30.Z-=A);
    M___32(M___32.Z-=Z) = EOB(M___9.Z-=B,M___8.Z-=A);
    M___39(SUM1-=Z) = MX21LB(M___37.Z-=S,M___32.Z-=A,M___31.Z-=B);
    M___31(M___31.Z-=Z) = ENB(M___8.Z-=B,M___1.Z-=A);
    M___6(M___6.Z-=Z) = N1C(M___5.Z-=A);
    M___18(M___18.Z-=Z) = N1B(M___13.Z-=A);
    M___13(M___13.Z-=Z) = NR2C(A2-=A,B2-=B);
    M___12(M___12.Z-=Z) = ND2C(B2-=B,A2-=A);
    M___25(M___25.Z-=Z) = ND2B(M___18.Z-=B,M___12.Z-=A);
```

```
    M___26(M___26.Z-=Z) = N1B(M___25.Z-=A);
    M___34(M___34.Z-=Z) = MX21LA(M___11.Z-=S,M___25.Z-=B,M___26.Z-=A);
    M___11(M___11.Z-=Z) = ND2C(M___6.Z-=B,M___3.Z-=A);
    M___4(M___4.Z-=Z) = NR2C(A1-=A,B1-=B);
    M___3(M___3.Z-=Z) = ND2C(B1-=B,A1-=A);
    M___8(M___8.Z-=Z) = ND2B(M___7.Z-=B,M___3.Z-=A);
    M___7(M___7.Z-=Z) = N1B(M___4.Z-=A);
    M___5(M___5.Z-=Z) = NR2C(M___4.Z-=A,M___2.Z-=B);
    M___1(M___1.Z-=Z) = ND2C(B0-=B,A0-=A);
    M___2(M___2.Z-=Z) = NR2C(A0-=A,B0-=B);
    M___9(M___9.Z-=Z) = N1B(M___2.Z-=A);
    M___29(M___29.Z-=Z) = ND2B(M___9.Z-=B,M___1.Z-=A);
    M___10(M___10.Z-=Z) = AO7B(M___3.Z-=C,M___4.Z-=B,M___1.Z-=A);
    M___33(M___33.Z-=Z) = MX21LA(M___25.Z-=B,M___26.Z-=A,M___10.Z-=S);
    M___40(SUM2-=Z) = MX21LB(M___37.Z-=S,M___34.Z-=A,M___33.Z-=B);

  /* extractors ******************************/


  /* type converters *********************/

ANNOTATIONS
{
  BUS BUS_TYPE = "DOT";
}

END MODULE;


/* * * * * * *  Contents of NET file ADD23F.NET  * * * * * * */

/*******************************************************/
/*  Netlist copyright (C) 1989 LSI Logic Corporation   */
/*******************************************************/


MODULE ADD23F;

INPUTS      A.22,A.21,A.20,A.19,A.18,A.17,A.16,A.15,A.14,A.13,
            A.12,A.11,A.10,A.9,A.8,A.7,A.6,A.5,A.4,A.3,A.2,A.1,
            A.0,B.22,B.21,B.20,B.19,B.18,B.17,B.16,B.15,B.14,B.13,
            B.12,B.11,B.10,B.9,B.8,B.7,B.6,B.5,B.4,B.3,B.2,B.1,
            B.0;
OUTPUTS     S.22,S.21,S.20,S.19,S.18,S.17,S.16,S.15,S.14,S.13,
            S.12,S.11,S.10,S.9,S.8,S.7,S.6,S.5,S.4,S.3,S.2,S.1,
            S.0;

LEVEL FUNCTION;
DEFINE
  /* implicit connectors *******************/

    A-.22 = (A.22);
    A-.21 = (A.21);
    A-.20 = (A.20);
    A-.19 = (A.19);
    A-.18 = (A.18);
    A-.17 = (A.17);
    A-.16 = (A.16);
    A-.15 = (A.15);
    A-.14 = (A.14);
    A-.13 = (A.13);
    A-.12 = (A.12);
    A-.11 = (A.11);
    A-.10 = (A.10);
    A-.9 = (A.9);
    A-.8 = (A.8);
    A-.7 = (A.7);
    A-.6 = (A.6);
    A-.5 = (A.5);
    A-.4 = (A.4);
    A-.3 = (A.3);
    A-.2 = (A.2);
```

```
A-.1 = (A.1);
A-.0 = (A.0);
B-.22 = (B.22);
B-.21 = (B.21);
B-.20 = (B.20);
B-.19 = (B.19);
B-.18 = (B.18);
B-.17 = (B.17);
B-.16 = (B.16);
B-.15 = (B.15);
B-.14 = (B.14);
B-.13 = (B.13);
B-.12 = (B.12);
B-.11 = (B.11);
B-.10 = (B.10);
B-.9 = (B.9);
B-.8 = (B.8);
B-.7 = (B.7);
B-.6 = (B.6);
B-.5 = (B.5);
B-.4 = (B.4);
B-.3 = (B.3);
B-.2 = (B.2);
B-.1 = (B.1);
B-.0 = (B.0);
S-.22 = (S.22);
S-.21 = (S.21);
S-.20 = (S.20);
S-.19 = (S.19);
S-.18 = (S.18);
S-.17 = (S.17);
S-.16 = (S.16);
S-.15 = (S.15);
S-.14 = (S.14);
S-.13 = (S.13);
S-.12 = (S.12);
S-.11 = (S.11);
S-.10 = (S.10);
S-.9 = (S.9);
S-.8 = (S.8);
S-.7 = (S.7);
S-.6 = (S.6);
S-.5 = (S.5);
S-.4 = (S.4);
S-.3 = (S.3);
S-.2 = (S.2);
S-.1 = (S.1);
S-.0 = (S.0);


/* part instances ***************************/

U1(U1.Z-=Z) = ND2B(U3.Z-=A,U2.Z-=B);
U2(U2.Z-=Z) = N1A(M___3.G-=A);
M___24(M___24.Z-=Z) = ND2C(M___4.P-=B,M___3.G-=A);
M___4(M___4.SUM1-=SUM1,M___4.SUM2-=SUM2,M___4.SUM3-=SUM3,
        M___4.SUM0-=SUM0,M___4.G-=G,M___4.P-=P) = ADD23F_SEL4(
        U1.Z-=CI,M___4.B1-=B1,M___4.B2-=B2,M___4.B3-=B3,
        M___4.B0-=B0,M___4.A0-=A0,M___4.A1-=A1,M___4.A2-=A2,
        M___4.A3-=A3);
M___25(M___25.Z-=Z) = N1C(M___4.G-=A);
M___26(M___26.Z-=Z) = ND2C(M___24.Z-=A,M___25.Z-=B);
M___28(M___28.Z-=Z) = N1B(M___26.Z-=A);
M___30(M___30.Z-=Z) = ND2B(M___27.Z-=A,M___28.Z-=B);
M___27(M___27.Z-=Z) = ND2B(M___16.Z-=A,M___23.Z-=B);
M___1(M___1.G-=G,M___1.SUM3-=SUM3,M___1.SUM2-=SUM2,M___1.SUM1-=SUM1,
        M___1.SUM0-=SUM0) = ADD23F0_SEL4(M___1.A0-=A0,M___1.A1-=A1,
        M___1.A2-=A2,M___1.A3-=A3,M___1.B0-=B0,M___1.B1-=B1,
        M___1.B2-=B2,M___1.B3-=B3);
M___14(M___14.Z-=Z) = ND2C(M___1.G-=A,M___2.P-=B);
M___2(M___2.SUM1-=SUM1,M___2.SUM2-=SUM2,M___2.SUM0-=SUM0,
        M___2.G-=G,M___2.P-=P,M___2.SUM3-=SUM3) = ADD23F_SEL4(
        M___1.G-=CI,M___2.B1-=B1,M___2.B2-=B2,M___2.B3-=B3,
        M___2.B0-=B0,M___2.A0-=A0,M___2.A1-=A1,M___2.A2-=A2,
        M___2.A3-=A3);
```

```
M___15(M___15.Z-=Z) = N1C(M___2.G-=A);
M___16(M___16.Z-=Z) = ND2C(M___14.Z-=A,M___15.Z-=B);
U3(U3.Z-=Z) = ND2B(M___16.Z-=A,M___3.P-=B);
M___23(M___23.Z-=Z) = AND2B(M___4.P-=B,M___3.P-=A);
M___33(M___33.Z-=Z) = ND3B(M___16.Z-=B,M___23.Z-=A,M___5.P-=C);
M___35(M___35.Z-=Z) = ND2C(M___34.Z-=B,M___33.Z-=A);
M___34(M___34.Z-=Z) = AO6B(M___5.P-=B,M___5.G-=C,M___26.Z-=A);
M___5(M___5.SUM1-=SUM1,M___5.SUM2-=SUM2,M___5.SUM3-=SUM3,
        M___5.SUM0-=SUM0,M___5.G-=G,M___5.P-=P) = ADD23F_SEL4(
        M___30.Z-=CI,M___5.B1-=B1,M___5.B2-=B2,M___5.B3-=B3,
        M___5.B0-=B0,M___5.A0-=A0,M___5.A1-=A1,M___5.A2-=A2,
        M___5.A3-=A3);
M___6(M___6.SUM1-=SUM1,M___6.SUM2-=SUM2,M___6.SUM0-=SUM0) =
        ADD23F_SEL3(M___35.Z-=CI,M___6.B1-=B1,M___6.B2-=B2,
        M___6.B0-=B0,M___6.A0-=A0,M___6.A1-=A1,M___6.A2-=A2);
M___3(M___3.SUM1-=SUM1,M___3.SUM2-=SUM2,M___3.SUM3-=SUM3,
        M___3.SUM0-=SUM0,M___3.G-=G,M___3.P-=P) = ADD23F_SEL4(
        M___16.Z-=CI,M___3.B3-=B3,M___3.B1-=B1,M___3.B2-=B2,
        M___3.B0-=B0,M___3.A0-=A0,M___3.A1-=A1,M___3.A2-=A2,
        M___3.A3-=A3);


/* extractors ******************************/

S-.9 = (M___3.SUM1-);
S-.10 = (M___3.SUM2-);
S-.11 = (M___3.SUM3-);
A-.10 = (M___3.A2-);
A-.9 = (M___3.A1-);
A-.8 = (M___3.A0-);
S-.21 = (M___6.SUM1-);
S-.22 = (M___6.SUM2-);
S-.20 = (M___6.SUM0-);
B-.8 = (M___3.B0-);
B-.21 = (M___6.B1-);
B-.10 = (M___3.B2-);
B-.11 = (M___3.B3-);
B-.9 = (M___3.B1-);
B-.22 = (M___6.B2-);
S-.17 = (M___5.SUM1-);
S-.18 = (M___5.SUM2-);
S-.19 = (M___5.SUM3-);
B-.17 = (M___5.B1-);
B-.19 = (M___5.B3-);
S-.16 = (M___5.SUM0-);
B-.16 = (M___5.B0-);
S-.13 = (M___4.SUM1-);
S-.14 = (M___4.SUM2-);
S-.15 = (M___4.SUM3-);
B-.13 = (M___4.B1-);
B-.14 = (M___4.B2-);
B-.15 = (M___4.B3-);
S-.12 = (M___4.SUM0-);
B-.12 = (M___4.B0-);
A-.12 = (M___4.A0-);
A-.13 = (M___4.A1-);
A-.14 = (M___4.A2-);
A-.15 = (M___4.A3-);
S-.5 = (M___2.SUM1-);
S-.6 = (M___2.SUM2-);
B-.5 = (M___2.B1-);
B-.6 = (M___2.B2-);
B-.7 = (M___2.B3-);
S-.4 = (M___2.SUM0-);
B-.4 = (M___2.B0-);
A-.0 = (M___1.A0-);
A-.1 = (M___1.A1-);
A-.2 = (M___1.A2-);
A-.3 = (M___1.A3-);
B-.0 = (M___1.B0-);
B-.1 = (M___1.B1-);
B-.2 = (M___1.B2-);
B-.3 = (M___1.B3-);
S-.3 = (M___1.SUM3-);
S-.2 = (M___1.SUM2-);
```

```
    S-.1 = (M___1.SUM1-);
    S-.0 = (M___1.SUM0-);
    A-.4 = (M___2.A0-);
    A-.5 = (M___2.A1-);
    A-.6 = (M___2.A2-);
    A-.7 = (M___2.A3-);
    S-.7 = (M___2.SUM3-);
    A-.16 = (M___5.A0-);
    A-.17 = (M___5.A1-);
    A-.18 = (M___5.A2-);
    A-.19 = (M___5.A3-);
    B-.18 = (M___5.B2-);
    B-.20 = (M___6.B0-);
    A-.21 = (M___6.A1-);
    A-.22 = (M___6.A2-);
    A-.20 = (M___6.A0-);
    A-.11 = (M___3.A3-);
    S-.8 = (M___3.SUM0-);

  /* type converters *********************/

ANNOTATIONS
{
  BUS BUS_TYPE = "DOT";
}

END MODULE;


/* * * * * * *  Contents of NET file ADD23F_SEL4.NET  * * * * * * */

/*******************************************************/
/*  Netlist copyright (C) 1989 LSI Logic Corporation   */

/*******************************************************/


MODULE ADD23F_SEL4;

INPUTS       A0,A1,A2,A3,B0,B1,B2,B3,CI;
OUTPUTS      G,P,SUM0,SUM1,SUM2,SUM3;

LEVEL FUNCTION;
DEFINE
  /* implicit connectors ******************/

    SUM3- = (SUM3);
    SUM2- = (SUM2);
    B2- = (B2);
    A2- = (A2);
    P- = (P);
    B0- = (B0);
    A0- = (A0);
    SUM1- = (SUM1);
    CI- = (CI);
    B1- = (B1);
    A1- = (A1);
    G- = (G);
    A3- = (A3);
    B3- = (B3);
    SUM0- = (SUM0);


  /* part instances *************************/

    M___26(M___26.Z-=Z) = N1B(M___25.Z-=A);
    M___27(M___27.Z-=Z) = EOB(M___12.Z-=A,M___17.Z-=B);
    M___12(M___12.Z-=Z) = ND2C(A2-=A,B2-=B);
    M___13(M___13.Z-=Z) = NR2C(B2-=B,A2-=A);
    M___11(M___11.Z-=Z) = ND2C(M___3.Z-=A,M___6.Z-=B);
    M___6(M___6.Z-=Z) = N1C(M___5.Z-=A);
    M___1(M___1.Z-=Z) = ND2C(A0-=A,B0-=B);
```

```
    M___2(M___2.Z-=Z) = NR2C(B0-=B,A0-=A);
    M___37(M___37.Z-=Z) = N1D(CI-=A);
    M___39(SUM1-=Z) = MX21LB(M___37.Z-=S,M___32.Z-=A,M___31.Z-=B);
    M___32(M___32.Z-=Z) = EOB(M___8.Z-=A,M___9.Z-=B);
    M___9(M___9.Z-=Z) = N1B(M___2.Z-=A);
    M___3(M___3.Z-=Z) = ND2C(A1-=A,B1-=B);
    M___4(M___4.Z-=Z) = NR2C(B1-=B,A1-=A);
    M___7(M___7.Z-=Z) = N1B(M___4.Z-=A);
    M___5(M___5.Z-=Z) = NR2C(M___2.Z-=B,M___4.Z-=A);
    M___42(P-=Z) = AND2B(M___20.Z-=B,M___5.Z-=A);
    M___22(M___22.Z-=Z) = N1C(M___19.Z-=A);
    M___43(G-=Z) = ND2C(M___22.Z-=B,M___21.Z-=A);
    M___21(M___21.Z-=Z) = ND2B(M___10.Z-=B,M___20.Z-=A);
    M___20(M___20.Z-=Z) = NR2C(M___13.Z-=A,M___15.Z-=B);
    M___18(M___18.Z-=Z) = N1B(M___13.Z-=A);
    M___28(M___28.Z-=Z) = ENB(M___17.Z-=A,M___18.Z-=B);
    M___17(M___17.Z-=Z) = ND2C(M___14.Z-=A,M___16.Z-=B);
    M___16(M___16.Z-=Z) = N1B(M___15.Z-=A);
    M___15(M___15.Z-=Z) = NR2C(B3-=B,A3-=A);
    M___14(M___14.Z-=Z) = ND2C(A3-=A,B3-=B);
    M___19(M___19.Z-=Z) = AO7A(M___15.Z-=B,M___12.Z-=A,M___14.Z-=C);
    M___25(M___25.Z-=Z) = ND2B(M___18.Z-=B,M___12.Z-=A);
    M___33(M___33.Z-=Z) = MX21LA(M___10.Z-=S,M___26.Z-=A,M___25.Z-=B);
    M___40(SUM2-=Z) = MX21LB(M___37.Z-=S,M___34.Z-=A,M___33.Z-=B);
    M___34(M___34.Z-=Z) = MX21LA(M___26.Z-=A,M___25.Z-=B,M___11.Z-=S);
    M___36(M___36.Z-=Z) = MX21LA(M___28.Z-=B,M___27.Z-=A,M___11.Z-=S);
    M___41(SUM3-=Z) = MX21LB(M___37.Z-=S,M___35.Z-=B,M___36.Z-=A);
    M___35(M___35.Z-=Z) = MX21LA(M___10.Z-=S,M___28.Z-=B,M___27.Z-=A);
    M___10(M___10.Z-=Z) = AO7B(M___1.Z-=A,M___4.Z-=B,M___3.Z-=C);
    M___8(M___8.Z-=Z) = ND2B(M___7.Z-=B,M___3.Z-=A);
    M___31(M___31.Z-=Z) = ENB(M___1.Z-=A,M___8.Z-=B);
    M___29(M___29.Z-=Z) = ND2B(M___9.Z-=B,M___1.Z-=A);
    M___30(M___30.Z-=Z) = N1C(M___29.Z-=A);
    M___38(SUM0-=Z) = MX21LB(M___29.Z-=B,M___37.Z-=S,M___30.Z-=A);


  /* extractors ******************************/


  /* type converters *********************/

ANNOTATIONS
{
  BUS BUS_TYPE = "DOT";
}

END MODULE;


/* * * * * * *  Contents of NET file XAUV2.NET  * * * * * * */

/*******************************************************/
/*  Netlist copyright (C) 1989 LSI Logic Corporation  */
/*******************************************************/


MODULE XAUV2;

INPUTS      CLRAU,COF_ADRIN.2,COF_ADRIN.1,COF_ADRIN.0,CP,DH_CS_,
            DL_CS_,ENAU,INT_GT_1IN,PDI.15,PDI.14,PDI.13,PDI.12,
            PDI.11,PDI.10,PDI.9,PDI.8,PDI.7,PDI.6,PDI.5,PDI.4,
            PDI.3,PDI.2,PDI.1,PDI.0,PIX_EN,RESET_,SCNIN,SPRCYC,
            S_MODE,TEST,WAIT,WR_;
OUTPUTS     CLRXCNT_,COF_ADR.2,COF_ADR.1,COF_ADR.0,INT_GT_1,
            P1_BUSY;

LEVEL FUNCTION;
DEFINE
  /* implicit connectors *******************/

    P1_BUSY- = (P1_BUSY);
    CLR_- = (CLR_);
```

```
CP- = (CP);
CP- = (CP);
CP- = (CP);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
DH_CS_- = (DH_CS_);
DL_CS_- = (DL_CS_);
SCNIN- = (SCNIN);
TEST- = (TEST);
WR_- = (WR_);
RESET_- = (RESET_);
CLRXCNT_- = (CLRXCNT_);
CLR_- = (CLR_);
CLRAU- = (CLRAU);
BRESET_- = (BRESET_);
BRESET_- = (BRESET_);
M-0 = (NC/1/);
M-1 = (NC/0/);
S_MODE- = (S_MODE);
WAIT- = (WAIT);
INT_GT_1- = (INT_GT_1);
INT_GT_1IN- = (INT_GT_1IN);
PIX_EN- = (PIX_EN);
EN- = (EN);
EN- = (EN);
ENAU- = (ENAU);
SPRCYC- = (SPRCYC);
EN- = (EN);
EN- = (EN);
CLR_- = (CLR_);
CLR_- = (CLR_);
COF_ADRIN-.2 = (COF_ADRIN.2);
COF_ADRIN-.1 = (COF_ADRIN.1);
COF_ADRIN-.0 = (COF_ADRIN.0);
COF_ADR-.2 = (COF_ADR.2);
COF_ADR-.1 = (COF_ADR.1);
COF_ADR-.0 = (COF_ADR.0);
S_MODE- = (S_MODE);


/* part instances ***************************/

U6(CLRXCNT_-=Z) = B3A(CLR_-=A);
U5(CLR_-=Z) = NR2B(U3.Z1-=A,CLRAU-=B);
U3(U3.Z1-=Z1,BRESET_-=Z2) = B3IA(RESET_-=A);
U0(U0.Q-.22=Q.22,U0.Q-.21=Q.21,U0.Q-.20=Q.20,U0.Q-.19=Q.19,
        U0.Q-.18=Q.18,U0.Q-.17=Q.17,U0.Q-.16=Q.16,U0.Q-.15=Q.15,
        U0.Q-.14=Q.14,U0.Q-.13=Q.13,U0.Q-.12=Q.12,U0.Q-.11=Q.11,
        U0.Q-.10=Q.10,U0.Q-.9=Q.9,U0.Q-.8=Q.8,U0.Q-.7=Q.7,
        U0.Q-.6=Q.6,U0.Q-.5=Q.5,U0.Q-.4=Q.4,U0.Q-.3=Q.3,
        U0.Q-.2=Q.2,U0.Q-.1=Q.1,U0.Q-.0=Q.0) = REG23(PDI-.15=PDI.15,
        PDI-.14=PDI.14,PDI-.13=PDI.13,PDI-.12=PDI.12,PDI-.11=PDI.11,
        PDI-.10=PDI.10,PDI-.9=PDI.9,PDI-.8=PDI.8,PDI-.7=PDI.7,
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,DH_CS_-=DH_CS_,
        DL_CS_-=DL_CS_,SCNIN-=SCNIN,TEST-=TEST,WR_-=CP,
        BRESET_-=RESET_);
U7(U7.Z-.22=Z.22,U7.Z-.21=Z.21,U7.Z-.20=Z.20,U7.Z-.19=Z.19,
        U7.Z-.18=Z.18,U7.Z-.17=Z.17,U7.Z-.16=Z.16,U7.Z-.15=Z.15,
        U7.Z-.14=Z.14,U7.Z-.13=Z.13,U7.Z-.12=Z.12,U7.Z-.11=Z.11,
```

```
        U7.Z-.10=Z.10,U7.Z-.9=Z.9,U7.Z-.8=Z.8,U7.Z-.7=Z.7,
        U7.Z-.6=Z.6,U7.Z-.5=Z.5,U7.Z-.4=Z.4,U7.Z-.3=Z.3,
        U7.Z-.2=Z.2,U7.Z-.1=Z.1,U7.Z-.0=Z.0) = MUX2X1W23(
        U14.QN-=S,U0.Q-.22=A.22,U0.Q-.21=A.21,U0.Q-.20=A.20,
        U0.Q-.19=A.19,U0.Q-.18=A.18,U0.Q-.17=A.17,U0.Q-.16=A.16,
        U0.Q-.15=A.15,U0.Q-.14=A.14,U0.Q-.13=A.13,U0.Q-.12=A.12,
        U0.Q-.11=A.11,U0.Q-.10=A.10,U0.Q-.9=A.9,U0.Q-.8=A.8,
        U0.Q-.7=A.7,U0.Q-.6=A.6,U0.Q-.5=A.5,U0.Q-.4=A.4,
        U0.Q-.3=A.3,U0.Q-.2=A.2,U0.Q-.1=A.1,U0.Q-.0=A.0,
        U7.B-.22=B.22,U7.B-.21=B.21,U7.B-.20=B.20,U7.B-.19=B.19,
        U7.B-.18=B.18,U7.B-.17=B.17,U7.B-.16=B.16,U7.B-.15=B.15,
        U7.B-.14=B.14,U7.B-.13=B.13,U7.B-.12=B.12,U7.B-.11=B.11,
        U7.B-.10=B.10,U7.B-.9=B.9,U7.B-.8=B.8,U7.B-.7=B.7,
        U7.B-.6=B.6,U7.B-.5=B.5,U7.B-.4=B.4,U7.B-.3=B.3,
        U7.B-.2=B.2,U7.B-.1=B.1,U7.B-.0=B.0);
U8(U8.S-.22=S.22,U8.S-.21=S.21,U8.S-.20=S.20,U8.S-.19=S.19,
        U8.S-.18=S.18,U8.S-.17=S.17,U8.S-.16=S.16,U8.S-.15=S.15,
        U8.S-.14=S.14,U8.S-.13=S.13,U8.S-.12=S.12,U8.S-.11=S.11,
        U8.S-.10=S.10,U8.S-.9=S.9,U8.S-.8=S.8,U8.S-.7=S.7,
        U8.S-.6=S.6,U8.S-.5=S.5,U8.S-.4=S.4,U8.S-.3=S.3,
        U8.S-.2=S.2,U8.S-.1=S.1,U8.S-.0=S.0) = ADD23F(U11.Q-.22=B.22,
        U11.Q-.21=B.21,U11.Q-.20=B.20,U11.Q-.19=B.19,
        U11.Q-.18=B.18,U11.Q-.17=B.17,U11.Q-.16=B.16,
        U11.Q-.15=B.15,U11.Q-.14=B.14,U11.Q-.13=B.13,
        U11.Q-.12=B.12,U11.Q-.11=B.11,U11.Q-.10=B.10,U11.Q-.9=B.9,
        U11.Q-.8=B.8,U11.Q-.7=B.7,U11.Q-.6=B.6,U11.Q-.5=B.5,
        U11.Q-.4=B.4,U11.Q-.3=B.3,U11.Q-.2=B.2,U11.Q-.1=B.1,
        U11.Q-.0=B.0,U7.Z-.22=A.22,U7.Z-.21=A.21,U7.Z-.20=A.20,
        U7.Z-.19=A.19,U7.Z-.18=A.18,U7.Z-.17=A.17,U7.Z-.16=A.16,
        U7.Z-.15=A.15,U7.Z-.14=A.14,U7.Z-.13=A.13,U7.Z-.12=A.12,
        U7.Z-.11=A.11,U7.Z-.10=A.10,U7.Z-.9=A.9,U7.Z-.8=A.8,
        U7.Z-.7=A.7,U7.Z-.6=A.6,U7.Z-.5=A.5,U7.Z-.4=A.4,
        U7.Z-.3=A.3,U7.Z-.2=A.2,U7.Z-.1=A.1,U7.Z-.0=A.0);
U13(U13.Z-=Z) = OR3B(U13.C-=C,U13.B-=B,U13.A-=A);
U16(INT_GT_1-=Z) = NR2C(WAIT-=A,U15.Z-=B);
U18(U18.Z-=Z) = N1C(PIX_EN-=A);
U4(U4.Z-=Z) = AND2C(INT_GT_1IN-=A,U18.Z-=B);
U15(U15.Z-=Z) = MX21LB(U14.Q-=A,S_MODE-=S,U4.Z-=B);
U14(U14.QN-=QN,U14.Q-=Q) = FD2SA(CLR_-=CD,EN-=TE,CP-=CP,U13.Z-=D,
        U14.Q-=TI);
U1(U1.Z-=Z) = N1A(SPRCYC-=A);
U2(EN-=Z) = ND2B(ENAU-=B,U1.Z-=A);
U17(P1_BUSY-=Q) = FD2SA(P1_BUSY-=TI,INT_GT_1-=D,CP-=CP,EN-=TE,
        CLR_-=CD);
U11.22(U11.Q-.22=Q) = FD2SA(U8.S-.22=D,EN-=TE,CP-=CP,U11.Q-.22=TI,
        CLR_-=CD);
U11.21(U11.Q-.21=Q) = FD2SA(U8.S-.21=D,EN-=TE,CP-=CP,U11.Q-.21=TI,
        CLR_-=CD);
U11.20(U11.Q-.20=Q) = FD2SA(U8.S-.20=D,EN-=TE,CP-=CP,U11.Q-.20=TI,
        CLR_-=CD);
U11.19(U11.Q-.19=Q) = FD2SA(U8.S-.19=D,EN-=TE,CP-=CP,U11.Q-.19=TI,
        CLR_-=CD);
U11.18(U11.Q-.18=Q) = FD2SA(U8.S-.18=D,EN-=TE,CP-=CP,U11.Q-.18=TI,
        CLR_-=CD);
U11.17(U11.Q-.17=Q) = FD2SA(U8.S-.17=D,EN-=TE,CP-=CP,U11.Q-.17=TI,
        CLR_-=CD);
U11.16(U11.Q-.16=Q) = FD2SA(U8.S-.16=D,EN-=TE,CP-=CP,U11.Q-.16=TI,
        CLR_-=CD);
U11.15(U11.Q-.15=Q) = FD2SA(U8.S-.15=D,EN-=TE,CP-=CP,U11.Q-.15=TI,
        CLR_-=CD);
U11.14(U11.Q-.14=Q) = FD2SA(U8.S-.14=D,EN-=TE,CP-=CP,U11.Q-.14=TI,
        CLR_-=CD);
U11.13(U11.Q-.13=Q) = FD2SA(U8.S-.13=D,EN-=TE,CP-=CP,U11.Q-.13=TI,
        CLR_-=CD);
U11.12(U11.Q-.12=Q) = FD2SA(U8.S-.12=D,EN-=TE,CP-=CP,U11.Q-.12=TI,
        CLR_-=CD);
U11.11(U11.Q-.11=Q) = FD2SA(U8.S-.11=D,EN-=TE,CP-=CP,U11.Q-.11=TI,
        CLR_-=CD);
U11.10(U11.Q-.10=Q) = FD2SA(U8.S-.10=D,EN-=TE,CP-=CP,U11.Q-.10=TI,
        CLR_-=CD);
U11.9(U11.Q-.9=Q) = FD2SA(U8.S-.9=D,EN-=TE,CP-=CP,U11.Q-.9=TI,
        CLR_-=CD);
U11.8(U11.Q-.8=Q) = FD2SA(U8.S-.8=D,EN-=TE,CP-=CP,U11.Q-.8=TI,
        CLR_-=CD);
```

```
U11.7(U11.Q-.7=Q) = FD2SA(U8.S-.7=D,EN-=TE,CP-=CP,U11.Q-.7=TI,
        CLR_-=CD);
U11.6(U11.Q-.6=Q) = FD2SA(U8.S-.6=D,EN-=TE,CP-=CP,U11.Q-.6=TI,
        CLR_-=CD);
U11.5(U11.Q-.5=Q) = FD2SA(U8.S-.5=D,EN-=TE,CP-=CP,U11.Q-.5=TI,
        CLR_-=CD);
U11.4(U11.Q-.4=Q) = FD2SA(U8.S-.4=D,EN-=TE,CP-=CP,U11.Q-.4=TI,
        CLR_-=CD);
U11.3(U11.Q-.3=Q) = FD2SA(U8.S-.3=D,EN-=TE,CP-=CP,U11.Q-.3=TI,
        CLR_-=CD);
U11.2(U11.Q-.2=Q) = FD2SA(U8.S-.2=D,EN-=TE,CP-=CP,U11.Q-.2=TI,
        CLR_-=CD);
U11.1(U11.Q-.1=Q) = FD2SA(U8.S-.1=D,EN-=TE,CP-=CP,U11.Q-.1=TI,
        CLR_-=CD);
U11.0(U11.Q-.0=Q) = FD2SA(U8.S-.0=D,EN-=TE,CP-=CP,U11.Q-.0=TI,
        CLR_-=CD);
U12.2(COF_ADR-.2=Z) = N1B(U10.Z-.2=A);
U12.1(COF_ADR-.1=Z) = N1B(U10.Z-.1=A);
U12.0(COF_ADR-.0=Z) = N1B(U10.Z-.0=A);
U10.2(U10.Z-.2=Z) = MX21LB(U10.A-.2=A,COF_ADRIN-.2=B,S_MODE-=S);
U10.1(U10.Z-.1=Z) = MX21LB(U10.A-.1=A,COF_ADRIN-.1=B,S_MODE-=S);
U10.0(U10.Z-.0=Z) = MX21LB(U10.A-.0=A,COF_ADRIN-.0=B,S_MODE-=S);

/* extractors ******************************/

U7.B-.22 = (M-0);
U7.B-.21 = (M-0);
U7.B-.20 = (M-0);
U7.B-.15 = (M-1);
U7.B-.0 = (M-1);
U7.B-.8 = (M-1);
U7.B-.19 = (M-1);
U7.B-.11 = (M-1);
U7.B-.14 = (M-1);
U7.B-.1 = (M-1);
U7.B-.16 = (M-1);
U7.B-.17 = (M-1);
U7.B-.2 = (M-1);
U7.B-.9 = (M-1);
U7.B-.3 = (M-1);
U7.B-.13 = (M-1);
U7.B-.18 = (M-1);
U7.B-.6 = (M-1);
U7.B-.7 = (M-1);
U7.B-.12 = (M-1);
U7.B-.4 = (M-1);
U7.B-.5 = (M-1);
U7.B-.10 = (M-1);
U8.S-.21 = (U13.B-);
U8.S-.22 = (U13.C-);
U8.S-.20 = (U13.A-);
U11.Q-.19 = (U10.A-.2);
U11.Q-.18 = (U10.A-.1);
U11.Q-.17 = (U10.A-.0);

/* type converters *********************/

ANNOTATIONS

{
  BUS BUS_TYPE = "DOT";
}

END MODULE;


/* * * * * * * Contents of NET file MX5W12.NET * * * * * * */

/*******************************************************/
/* Netlist copyright (C) 1989 LSI Logic Corporation */
/*******************************************************/
```

```
MODULE MX5W12;

INPUTS      D0.11,D0.10,D0.9,D0.8,D0.7,D0.6,D0.5,D0.4,D0.3,D0.2,
            D0.1,D0.0,D1.11,D1.10,D1.9,D1.8,D1.7,D1.6,D1.5,D1.4,
            D1.3,D1.2,D1.1,D1.0,D2.11,D2.10,D2.9,D2.8,D2.7,D2.6,
            D2.5,D2.4,D2.3,D2.2,D2.1,D2.0,D3.11,D3.10,D3.9,D3.8,
            D3.7,D3.6,D3.5,D3.4,D3.3,D3.2,D3.1,D3.0,D4.11,D4.10,
            D4.9,D4.8,D4.7,D4.6,D4.5,D4.4,D4.3,D4.2,D4.1,D4.0,S.4,
            S.3,S.2,S.1,S.0;
OUTPUTS     Z.11,Z.10,Z.9,Z.8,Z.7,Z.6,Z.5,Z.4,Z.3,Z.2,Z.1,Z.0;

LEVEL FUNCTION;
DEFINE
  /* implicit connectors *******************/

    D0-.11 = (D0.11);
    D0-.10 = (D0.10);
    D0-.9 = (D0.9);
    D0-.8 = (D0.8);
    D0-.7 = (D0.7);
    D0-.6 = (D0.6);
    D0-.5 = (D0.5);
    D0-.4 = (D0.4);
    D0-.3 = (D0.3);
    D0-.2 = (D0.2);
    D0-.1 = (D0.1);
    D0-.0 = (D0.0);
    D1-.11 = (D1.11);
    D1-.10 = (D1.10);
    D1-.9 = (D1.9);
    D1-.8 = (D1.8);
    D1-.7 = (D1.7);
    D1-.6 = (D1.6);
    D1-.5 = (D1.5);
    D1-.4 = (D1.4);
    D1-.3 = (D1.3);
    D1-.2 = (D1.2);
    D1-.1 = (D1.1);
    D1-.0 = (D1.0);
    D2-.11 = (D2.11);
    D2-.10 = (D2.10);
    D2-.9 = (D2.9);
    D2-.8 = (D2.8);
    D2-.7 = (D2.7);
    D2-.6 = (D2.6);
    D2-.5 = (D2.5);
    D2-.4 = (D2.4);
    D2-.3 = (D2.3);
    D2-.2 = (D2.2);
    D2-.1 = (D2.1);
    D2-.0 = (D2.0);
    S-.4 = (S.4);
    S-.3 = (S.3);
    S-.2 = (S.2);
    S-.1 = (S.1);
    S-.0 = (S.0);
    D3-.11 = (D3.11);
    D3-.10 = (D3.10);
    D3-.9 = (D3.9);
    D3-.8 = (D3.8);
    D3-.7 = (D3.7);
    D3-.6 = (D3.6);
    D3-.5 = (D3.5);
    D3-.4 = (D3.4);
    D3-.3 = (D3.3);
    D3-.2 = (D3.2);
    D3-.1 = (D3.1);
    D3-.0 = (D3.0);
    D4-.11 = (D4.11);
    D4-.10 = (D4.10);
    D4-.9 = (D4.9);
    D4-.8 = (D4.8);
    D4-.7 = (D4.7);
```

```
D4-.6 = (D4.6);
D4-.5 = (D4.5);
D4-.4 = (D4.4);
D4-.3 = (D4.3);
D4-.2 = (D4.2);
D4-.1 = (D4.1);
D4-.0 = (D4.0);
Z-.11 = (Z.11);
Z-.10 = (Z.10);
Z-.9 = (Z.9);
Z-.8 = (Z.8);
Z-.7 = (Z.7);
Z-.6 = (Z.6);
Z-.5 = (Z.5);
Z-.4 = (Z.4);
Z-.3 = (Z.3);
Z-.2 = (Z.2);
Z-.1 = (Z.1);
Z-.0 = (Z.0);


/* part instances ***************************/

M___36(M___36.Z-=Z) = ND2B(M___36.A-=A,M___7.Z-=B);
M___37(M___37.Z-=Z) = ND2B(M___37.A-=A,M___8.Z-=B);
M___49(M___49.Z-=Z) = ND2B(M___49.A-=A,M___8.Z-=B);
M___7(M___7.Z-=Z) = N1D(M___2.Z-=A);
M___2(M___2.Z-=Z) = N1C(M___2.A-=A);
M___8(M___8.Z-=Z) = N1D(M___3.Z-=A);
M___3(M___3.Z-=Z) = N1C(M___3.A-=A);
M___10(M___10.Z-=Z) = N1D(M___5.Z-=A);
M___5(M___5.Z-=Z) = N1C(M___5.A-=A);
M___6(M___6.Z-=Z) = N1D(M___1.Z-=A);
M___1(M___1.Z-=Z) = N1C(M___1.A-=A);
M___4(M___4.Z-=Z) = N1C(M___4.A-=A);
M___9(M___9.Z-=Z) = N1D(M___4.Z-=A);
M___68(M___68.Z-=Z) = ND2B(M___68.A-=A,M___9.Z-=B);
M___80(M___80.Z-=Z) = ND2B(M___80.A-=A,M___9.Z-=B);
M___50(M___50.Z-=Z) = ND2B(M___50.A-=A,M___9.Z-=B);
M___74(M___74.Z-=Z) = ND2B(M___74.A-=A,M___9.Z-=B);
M___72(M___72.Z-=Z) = ND2B(M___72.A-=A,M___7.Z-=B);
M___73(M___73.Z-=Z) = ND2B(M___73.A-=A,M___8.Z-=B);
M___71(M___71.Z-=Z) = ND2B(M___71.A-=A,M___6.Z-=B);
M___76(M___76.Z-=Z) = ND5C(M___74.Z-=D,M___75.Z-=E,M___72.Z-=B,
        M___73.Z-=C,M___71.Z-=A);
M___75(M___75.Z-=Z) = ND2B(M___75.A-=A,M___10.Z-=B);
M___56(M___56.Z-=Z) = ND2B(M___56.A-=A,M___9.Z-=B);
M___55(M___55.Z-=Z) = ND2B(M___55.A-=A,M___8.Z-=B);
M___54(M___54.Z-=Z) = ND2B(M___54.A-=A,M___7.Z-=B);
M___53(M___53.Z-=Z) = ND2B(M___53.A-=A,M___6.Z-=B);
M___58(M___58.Z-=Z) = ND5C(M___56.Z-=D,M___57.Z-=E,M___55.Z-=C,
        M___54.Z-=B,M___53.Z-=A);
M___57(M___57.Z-=Z) = ND2B(M___57.A-=A,M___10.Z-=B);
M___26(M___26.Z-=Z) = ND2B(M___26.A-=A,M___9.Z-=B);
M___25(M___25.Z-=Z) = ND2B(M___25.A-=A,M___8.Z-=B);
M___24(M___24.Z-=Z) = ND2B(M___24.A-=A,M___7.Z-=B);
M___23(M___23.Z-=Z) = ND2B(M___23.A-=A,M___6.Z-=B);
M___28(M___28.Z-=Z) = ND5C(M___26.Z-=D,M___27.Z-=E,M___25.Z-=C,
        M___24.Z-=B,M___23.Z-=A);
M___27(M___27.Z-=Z) = ND2B(M___27.A-=A,M___10.Z-=B);
M___20(M___20.Z-=Z) = ND2B(M___20.A-=A,M___9.Z-=B);
M___19(M___19.Z-=Z) = ND2B(M___19.A-=A,M___8.Z-=B);
M___18(M___18.Z-=Z) = ND2B(M___18.A-=A,M___7.Z-=B);
M___17(M___17.Z-=Z) = ND2B(M___17.A-=A,M___6.Z-=B);
M___22(M___22.Z-=Z) = ND5C(M___20.Z-=D,M___21.Z-=E,M___19.Z-=C,
        M___18.Z-=B,M___17.Z-=A);
M___21(M___21.Z-=Z) = ND2B(M___21.A-=A,M___10.Z-=B);
M___32(M___32.Z-=Z) = ND2B(M___32.A-=A,M___9.Z-=B);
M___29(M___29.Z-=Z) = ND2B(M___29.A-=A,M___6.Z-=B);
M___34(M___34.Z-=Z) = ND5C(M___32.Z-=D,M___33.Z-=E,M___31.Z-=C,
        M___30.Z-=B,M___29.Z-=A);
M___33(M___33.Z-=Z) = ND2B(M___33.A-=A,M___10.Z-=B);
M___62(M___62.Z-=Z) = ND2B(M___62.A-=A,M___9.Z-=B);
```

```
M___61(M___61.Z-=Z) = ND2B(M___61.A-=A,M___8.Z-=B);
M___60(M___60.Z-=Z) = ND2B(M___60.A-=A,M___7.Z-=B);
M___59(M___59.Z-=Z) = ND2B(M___59.A-=A,M___6.Z-=B);
M___64(M___64.Z-=Z) = ND5C(M___62.Z-=D,M___63.Z-=E,M___61.Z-=C,
        M___60.Z-=B,M___59.Z-=A);
M___63(M___63.Z-=Z) = ND2B(M___63.A-=A,M___10.Z-=B);
M___69(M___69.Z-=Z) = ND2B(M___69.A-=A,M___10.Z-=B);
M___51(M___51.Z-=Z) = ND2B(M___51.A-=A,M___10.Z-=B);
M___39(M___39.Z-=Z) = ND2B(M___39.A-=A,M___10.Z-=B);
M___15(M___15.Z-=Z) = ND2B(M___15.A-=A,M___10.Z-=B);
M___13(M___13.Z-=Z) = ND2B(M___13.A-=A,M___8.Z-=B);
M___12(M___12.Z-=Z) = ND2B(M___12.A-=A,M___7.Z-=B);
M___16(M___16.Z-=Z) = ND5C(M___14.Z-=D,M___15.Z-=E,M___13.Z-=C,
        M___12.Z-=B,M___11.Z-=A);
M___14(M___14.Z-=Z) = ND2B(M___14.A-=A,M___9.Z-=B);
M___38(M___38.Z-=Z) = ND2B(M___38.A-=A,M___9.Z-=B);
M___44(M___44.Z-=Z) = ND2B(M___44.A-=A,M___9.Z-=B);
M___43(M___43.Z-=Z) = ND2B(M___43.A-=A,M___8.Z-=B);
M___42(M___42.Z-=Z) = ND2B(M___42.A-=A,M___7.Z-=B);
M___41(M___41.Z-=Z) = ND2B(M___41.A-=A,M___6.Z-=B);
M___46(M___46.Z-=Z) = ND5C(M___44.Z-=D,M___45.Z-=E,M___43.Z-=C,
        M___42.Z-=B,M___41.Z-=A);
M___45(M___45.Z-=Z) = ND2B(M___45.A-=A,M___10.Z-=B);
M___81(M___81.Z-=Z) = ND2B(M___81.A-=A,M___10.Z-=B);
M___77(M___77.Z-=Z) = ND2B(M___77.A-=A,M___6.Z-=B);
M___78(M___78.Z-=Z) = ND2B(M___78.A-=A,M___7.Z-=B);
M___82(M___82.Z-=Z) = ND5C(M___80.Z-=D,M___81.Z-=E,M___77.Z-=A,
        M___78.Z-=B,M___79.Z-=C);
M___79(M___79.Z-=Z) = ND2B(M___79.A-=A,M___8.Z-=B);
M___31(M___31.Z-=Z) = ND2B(M___31.A-=A,M___8.Z-=B);
M___67(M___67.Z-=Z) = ND2B(M___67.A-=A,M___8.Z-=B);
M___65(M___65.Z-=Z) = ND2B(M___65.A-=A,M___6.Z-=B);
M___70(M___70.Z-=Z) = ND5C(M___68.Z-=D,M___69.Z-=E,M___67.Z-=C,
        M___66.Z-=B,M___65.Z-=A);
M___66(M___66.Z-=Z) = ND2B(M___66.A-=A,M___7.Z-=B);
M___30(M___30.Z-=Z) = ND2B(M___30.A-=A,M___7.Z-=B);
M___48(M___48.Z-=Z) = ND2B(M___48.A-=A,M___7.Z-=B);
M___52(M___52.Z-=Z) = ND5C(M___50.Z-=D,M___51.Z-=E,M___49.Z-=C,
        M___48.Z-=B,M___47.Z-=A);
M___47(M___47.Z-=Z) = ND2B(M___47.A-=A,M___6.Z-=B);
M___11(M___11.Z-=Z) = ND2B(M___11.A-=A,M___6.Z-=B);
M___35(M___35.Z-=Z) = ND2B(M___35.A-=A,M___6.Z-=B);
M___40(M___40.Z-=Z) = ND5C(M___38.Z-=D,M___39.Z-=E,M___37.Z-=C,
        M___36.Z-=B,M___35.Z-=A);


/* extractors ******************************/

D0-.4 = (M___35.A-);
Z-.6 = (M___52.Z-);
D1-.4 = (M___36.A-);
D1-.6 = (M___48.A-);
D2-.9 = (M___67.A-);
D2-.4 = (M___37.A-);
D2-.6 = (M___49.A-);
S-.1 = (M___2.A-);
S-.2 = (M___3.A-);
S-.4 = (M___5.A-);
S-.0 = (M___1.A-);
S-.3 = (M___4.A-);
D3-.9 = (M___68.A-);
D3-.11 = (M___80.A-);
D3-.6 = (M___50.A-);
D3-.10 = (M___74.A-);
D1-.10 = (M___72.A-);
D2-.10 = (M___73.A-);
Z-.10 = (M___76.Z-);
D0-.10 = (M___71.A-);
D4-.10 = (M___75.A-);
D3-.7 = (M___56.A-);
D2-.7 = (M___55.A-);
Z-.7 = (M___58.Z-);
D1-.7 = (M___54.A-);
```

```
D0-.7 = (M___53.A-);
D4-.7 = (M___57.A-);
D4-.11 = (M___81.A-);
D3-.2 = (M___26.A-);
D2-.2 = (M___25.A-);
Z-.2 = (M___28.Z-);
D1-.2 = (M___24.A-);
D0-.2 = (M___23.A-);
D4-.2 = (M___27.A-);
D3-.1 = (M___20.A-);
D2-.1 = (M___19.A-);
Z-.1 = (M___22.Z-);
D1-.1 = (M___18.A-);
D0-.1 = (M___17.A-);
D4-.1 = (M___21.A-);
D3-.3 = (M___32.A-);
Z-.3 = (M___34.Z-);
D0-.3 = (M___29.A-);
D4-.3 = (M___33.A-);
D3-.8 = (M___62.A-);
D2-.8 = (M___61.A-);
Z-.8 = (M   64.Z-);
D1-.8 = (M___60.A-);
D0-.8 = (M___59.A-);
D4-.8 = (M___63.A-);
D4-.9 = (M___69.A-);
D4-.6 = (M___51.A-);
D4-.5 = (M___45.A-);
D4-.4 = (M___39.A-);
D4-.0 = (M___15.A-);
D2-.0 = (M___13.A-);
Z-.0 = (M___16.Z-);
D1-.0 = (M___12.A-);
D3-.0 = (M___14.A-);
D3-.5 = (M___44.A-);
D3-.4 = (M___38.A-);
D2-.5 = (M___43.A-);
Z-.5 = (M___46.Z-);
D1-.5 = (M___42.A-);
D0-.5 = (M___41.A-);
D0-.11 = (M___77.A-);
D1-.11 = (M___78.A-);
Z-.11 = (M___82.Z-);
D2-.11 = (M___79.A-);
D2-.3 = (M___31.A-);
Z-.9 = (M___70.Z-);
D0-.9 = (M___65.A-);
D1-.9 = (M___66.A-);
D1-.3 = (M___30.A-);
D0-.6 = (M___47.A-);
D0-.0 = (M___11.A-);
Z-.4 = (M___40.Z-);

/* type converters *********************/

ANNOTATIONS
{
  BUS BUS_TYPE = "DOT";
}

END MODULE;


/* * * * * * *  Contents of NET file MUX2X1W4.NET  * * * * * * */

/*******************************************************/
/*  Netlist copyright (C) 1989 LSI Logic Corporation   */
/*******************************************************/


MODULE MUX2X1W4;

INPUTS      A.3,A.2,A.1,A.0,B.3,B.2,B.1,B.0,S;
OUTPUTS     Z.3,Z.2,Z.1,Z.0;
```

```
LEVEL FUNCTION;
DEFINE
  /* implicit connectors *******************/

    A-.3 = (A.3);
    A-.2 = (A.2);
    A-.1 = (A.1);
    A-.0 = (A.0);
    Z-.3 = (Z.3);
    Z-.2 = (Z.2);
    Z-.1 = (Z.1);
    Z-.0 = (Z.0);
    S- = (S);
    B-.3 = (B.3);
    B-.2 = (B.2);
    B-.1 = (B.1);
    B-.0 = (B.0);

  /* part instances **************************/

    U0.3(Z-.3=Z) = N1D(U1.Z-.3=A);
    U0.2(Z-.2=Z) = N1D(U1.Z-.2=A);
    U0.1(Z-.1=Z) = N1D(U1.Z-.1=A);
    U0.0(Z-.0=Z) = N1D(U1.Z-.0=A);
    U1.3(U1.Z-.3=Z) = MX21LC(A-.3=A,B-.3=B,S-=S);
    U1.2(U1.Z-.2=Z) = MX21LC(A-.2=A,B-.2=B,S-=S);
    U1.1(U1.Z-.1=Z) = MX21LC(A-.1=A,B-.1=B,S-=S);
    U1.0(U1.Z-.0=Z) = MX21LC(A-.0=A,B-.0=B,S-=S);

  /* extractors *****************************/


  /* type converters *********************/

ANNOTATIONS
{
  BUS BUS_TYPE = "DOT";
}

END MODULE;


/* * * * * * *  Contents of NET file MEM16X60.NET  * * * * * * */

/*******************************************************/
/*  Netlist copyright (C) 1989 LSI Logic Corporation   */
/*******************************************************/


MODULE MEM16X60;

INPUTS      ADR.3,ADR.2,ADR.1,ADR.0,ALE,DI.11,DI.10,DI.9,DI.8,
            DI.7,DI.6,DI.5,DI.4,DI.3,DI.2,DI.1,DI.0,W0E,W1E,W2E,
            W3E,W4E,WE;
OUTPUTS     DO.59,DO.58,DO.57,DO.56,DO.55,DO.54,DO.53,DO.52,DO.51,
            DO.50,DO.49,DO.48,DO.47,DO.46,DO.45,DO.44,DO.43,DO.42,
            DO.41,DO.40,DO.39,DO.38,DO.37,DO.36,DO.35,DO.34,DO.33,
            DO.32,DO.31,DO.30,DO.29,DO.28,DO.27,DO.26,DO.25,DO.24,
            DO.23,DO.22,DO.21,DO.20,DO.19,DO.18,DO.17,DO.16,DO.15,
            DO.14,DO.13,DO.12,DO.11,DO.10,DO.9,DO.8,DO.7,DO.6,
            DO.5,DO.4,DO.3,DO.2,DO.1,DO.0,PDO.11,PDO.10,PDO.9,
            PDO.8,PDO.7,PDO.6,PDO.5,PDO.4,PDO.3,PDO.2,PDO.1,PDO.0;

LEVEL FUNCTION;
DEFINE
  /* implicit connectors *******************/

    DI-.11 = (DI.11);
    DI-.10 = (DI.10);
```

```
DI-.9 = (DI.9);
DI-.8 = (DI.8);
DI-.7 = (DI.7);
DI-.6 = (DI.6);
DI-.5 = (DI.5);
DI-.4 = (DI.4);
DI-.3 = (DI.3);
DI-.2 = (DI.2);
DI-.1 = (DI.1);
DI-.0 = (DI.0);
U1.OCK- = (NC/1/);
U1.SCK- = (NC/0/);
WE- = (WE);
ADR-.3 = (ADR.3);
ADR-.2 = (ADR.2);
ADR-.1 = (ADR.1);
ADR-.0 = (ADR.0);
ALE- = (ALE);
DO-.59 = (DO.59);
DO-.58 = (DO.58);
DO-.57 = (DO.57);
DO-.56 = (DO.56);
DO-.55 = (DO.55);
DO-.54 = (DO.54);
DO-.53 = (DO.53);
DO-.52 = (DO.52);
DO-.51 = (DO.51);
DO-.50 = (DO.50);
DO-.49 = (DO.49);
DO-.48 = (DO.48);
DO-.47 = (DO.47);
DO-.46 = (DO.46);
DO-.45 = (DO.45);
DO-.44 = (DO.44);
DO-.43 = (DO.43);
DO-.42 = (DO.42);
DO-.41 = (DO.41);
DO-.40 = (DO.40);
DO-.39 = (DO.39);
DO-.38 = (DO.38);
DO-.37 = (DO.37);
DO-.36 = (DO.36);
DO-.35 = (DO.35);
DO-.34 = (DO.34);
DO-.33 = (DO.33);
DO-.32 = (DO.32);
DO-.31 = (DO.31);
DO-.30 = (DO.30);
DO-.29 = (DO.29);
DO-.28 = (DO.28);
DO-.27 = (DO.27);
DO-.26 = (DO.26);
DO-.25 = (DO.25);
DO-.24 = (DO.24);
DO-.23 = (DO.23);
DO-.22 = (DO.22);
DO-.21 = (DO.21);
DO-.20 = (DO.20);
DO-.19 = (DO.19);
DO-.18 = (DO.18);
DO-.17 = (DO.17);
DO-.16 = (DO.16);
DO-.15 = (DO.15);
DO-.14 = (DO.14);
DO-.13 = (DO.13);
DO-.12 = (DO.12);
DO-.11 = (DO.11);
DO-.10 = (DO.10);
DO-.9 = (DO.9);
DO-.8 = (DO.8);
DO-.7 = (DO.7);
DO-.6 = (DO.6);
DO-.5 = (DO.5);
DO-.4 = (DO.4);
```

```
DO-.3 = (DO.3);
DO-.2 = (DO.2);
DO-.1 = (DO.1);
DO-.0 = (DO.0);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
W1E- = (W1E);
W1E- = (W1E);
W4E- = (W4E);
W4E- = (W4E);
W0E- = (W0E);
W0E- = (W0E);
W2E- = (W2E);
W3E- = (W3E);
W3E- = (W3E);
W2E- = (W2E);


/* part instances **************************/

U1(DO-.59=DO59,DO-.58=DO58,DO-.57=DO57,DO-.56=DO56,DO-.55=DO55,
        DO-.54=DO54,DO-.53=DO53,DO-.52=DO52,DO-.51=DO51,
        DO-.50=DO50,DO-.49=DO49,DO-.48=DO48,DO-.47=DO47,
        DO-.46=DO46,DO-.45=DO45,DO-.44=DO44,DO-.43=DO43,
        DO-.42=DO42,DO-.41=DO41,DO-.40=DO40,DO-.39=DO39,
        DO-.38=DO38,DO-.37=DO37,DO-.36=DO36,DO-.35=DO35,
        DO-.34=DO34,DO-.33=DO33,DO-.32=DO32,DO-.31=DO31,
        DO-.30=DO30,DO-.29=DO29,DO-.28=DO28,DO-.27=DO27,
        DO-.26=DO26,DO-.25=DO25,DO-.24=DO24,DO-.23=DO23,
        DO-.22=DO22,DO-.21=DO21,DO-.20=DO20,DO-.19=DO19,
        DO-.18=DO18,DO-.17=DO17,DO-.16=DO16,DO-.15=DO15,
        DO-.14=DO14,DO-.13=DO13,DO-.12=DO12,DO-.11=DO11,
        DO-.10=DO10,DO-.9=DO9,DO-.8=DO8,DO-.7=DO7,DO-.6=DO6,
        DO-.5=DO5,DO-.4=DO4,DO-.3=DO3,DO-.2=DO2,DO-.1=DO1,
        DO-.0=DO0) = RR16X60(U1.DI-.59=DI59,U1.DI-.58=DI58,
        U1.DI-.57=DI57,U1.DI-.56=DI56,U1.DI-.55=DI55,
        U1.DI-.54=DI54,U1.DI-.53=DI53,U1.DI-.52=DI52,
        U1.DI-.51=DI51,U1.DI-.50=DI50,U1.DI-.49=DI49,
        U1.DI-.48=DI48,U1.DI-.47=DI47,U1.DI-.46=DI46,
        U1.DI-.45=DI45,U1.DI-.44=DI44,U1.DI-.43=DI43,
        U1.DI-.42=DI42,U1.DI-.41=DI41,U1.DI-.40=DI40,
        U1.DI-.39=DI39,U1.DI-.38=DI38,U1.DI-.37=DI37,
        U1.DI-.36=DI36,U1.DI-.35=DI35,U1.DI-.34=DI34,
        U1.DI-.33=DI33,U1.DI-.32=DI32,U1.DI-.31=DI31,
        U1.DI-.30=DI30,U1.DI-.29=DI29,U1.DI-.28=DI28,
        U1.DI-.27=DI27,U1.DI-.26=DI26,U1.DI-.25=DI25,
        U1.DI-.24=DI24,U1.DI-.23=DI23,U1.DI-.22=DI22,
        U1.DI-.21=DI21,U1.DI-.20=DI20,U1.DI-.19=DI19,
        U1.DI-.18=DI18,U1.DI-.17=DI17,U1.DI-.16=DI16,
        U1.DI-.15=DI15,U1.DI-.14=DI14,U1.DI-.13=DI13,
        U1.DI-.12=DI12,U1.DI-.11=DI11,U1.DI-.10=DI10,U1.DI-.9=DI9,
        U1.DI-.8=DI8,U1.DI-.7=DI7,U1.DI-.6=DI6,U1.DI-.5=DI5,
        U1.DI-.4=DI4,U1.DI-.3=DI3,U1.DI-.2=DI2,U1.DI-.1=DI1,
        U1.DI-.0=DI0,U1.WBS-.14=WBS14,U1.WBS-.13=WBS13,
        U1.WBS-.12=WBS12,U1.WBS-.11=WBS11,U1.WBS-.10=WBS10,
        U1.WBS-.9=WBS9,U1.WBS-.8=WBS8,U1.WBS-.7=WBS7,
        U1.WBS-.6=WBS6,U1.WBS-.5=WBS5,U1.WBS-.4=WBS4,
        U1.WBS-.3=WBS3,U1.WBS-.2=WBS2,U1.WBS-.1=WBS1,
        U1.WBS-.0=WBS0,U1.OCK-=ICKDATA,U1.OCK-=OCK,U1.OEN-.14=OEN14,
        U1.OEN-.13=OEN13,U1.OEN-.12=OEN12,U1.OEN-.11=OEN11,
        U1.OEN-.10=OEN10,U1.OEN-.9=OEN9,U1.OEN-.8=OEN8,
        U1.OEN-.7=OEN7,U1.OEN-.6=OEN6,U1.OEN-.5=OEN5,
        U1.OEN-.4=OEN4,U1.OEN-.3=OEN3,U1.OEN-.2=OEN2,
        U1.OEN-.1=OEN1,U1.OEN-.0=OEN0,U1.SCK-=TWE,U1.SCK-=TOCK,
```

```
         U1.SCK-=T,U1.SCK-=SI,U1.SCK-=SCK,WE-=WE,ADR-.3=ADR3,
         ADR-.2=ADR2,ADR-.1=ADR1,ADR-.0=ADR0,ALE-=ICKADR);
U0(PDO-.11=Z.11,PDO-.10=Z.10,PDO-.9=Z.9,PDO-.8=Z.8,PDO-.7=Z.7,
         PDO-.6=Z.6,PDO-.5=Z.5,PDO-.4=Z.4,PDO-.3=Z.3,PDO-.2=Z.2,
         PDO-.1=Z.1,PDO-.0=Z.0) = MX5W12(U0.D0-.11=D0.11,
         U0.D0-.10=D0.10,U0.D0-.9=D0.9,U0.D0-.8=D0.8,U0.D0-.7=D0.7,
         U0.D0-.6=D0.6,U0.D0-.5=D0.5,U0.D0-.4=D0.4,U0.D0-.3=D0.3,
         U0.D0-.2=D0.2,U0.D0-.1=D0.1,U0.D0-.0=D0.0,U0.D1-.11=D1.11,
         U0.D1-.10=D1.10,U0.D1-.9=D1.9,U0.D1-.8=D1.8,U0.D1-.7=D1.7,
         U0.D1-.6=D1.6,U0.D1-.5=D1.5,U0.D1-.4=D1.4,U0.D1-.3=D1.3,
         U0.D1-.2=D1.2,U0.D1-.1=D1.1,U0.D1-.0=D1.0,U0.D4-.11=D4.11,
         U0.D4-.10=D4.10,U0.D4-.9=D4.9,U0.D4-.8=D4.8,U0.D4-.7=D4.7,
         U0.D4-.6=D4.6,U0.D4-.5=D4.5,U0.D4-.4=D4.4,U0.D4-.3=D4.3,
         U0.D4-.2=D4.2,U0.D4-.1=D4.1,U0.D4-.0=D4.0,U0.D3-.11=D3.11,
         U0.D3-.10=D3.10,U0.D3-.9=D3.9,U0.D3-.8=D3.8,U0.D3-.7=D3.7,
         U0.D3-.6=D3.6,U0.D3-.5=D3.5,U0.D3-.4=D3.4,U0.D3-.3=D3.3,
         U0.D3-.2=D3.2,U0.D3-.1=D3.1,U0.D3-.0=D3.0,U0.D2-.11=D2.11,
         U0.D2-.10=D2.10,U0.D2-.9=D2.9,U0.D2-.8=D2.8,U0.D2-.7=D2.7,
         U0.D2-.6=D2.6,U0.D2-.5=D2.5,U0.D2-.4=D2.4,U0.D2-.3=D2.3,
         U0.D2-.2=D2.2,U0.D2-.1=D2.1,U0.D2-.0=D2.0,U0.S-.4=S.4,
         U0.S-.3=S.3,U0.S-.2=S.2,U0.S-.1=S.1,U0.S-.0=S.0);


/* extractors ******************************/

  U1.WBS-.8 = (W2E-);
  U1.WBS-.6 = (W2E-);
  U1.WBS-.10 = (W3E-);
  U1.DI-.11 = (DI-.11);
  U1.DI-.10 = (DI-.10);
  U1.DI-.9 = (DI-.9);
  U1.DI-.8 = (DI-.8);
  U1.DI-.7 = (DI-.7);
  U1.DI-.6 = (DI-.6);
  U1.DI-.5 = (DI-.5);
  U1.DI-.4 = (DI-.4);
  U1.DI-.3 = (DI-.3);
  U1.DI-.2 = (DI-.2);
  U1.DI-.1 = (DI-.1);
  U1.DI-.0 = (DI-.0);
  U1.DI-.35 = (DI-.11);
  U1.DI-.34 = (DI-.10);
  U1.DI-.33 = (DI-.9);
  U1.DI-.32 = (DI-.8);
  U1.DI-.31 = (DI-.7);
  U1.DI-.30 = (DI-.6);
  U1.DI-.29 = (DI-.5);
  U1.DI-.28 = (DI-.4);
  U1.DI-.27 = (DI-.3);
  U1.DI-.26 = (DI-.2);
  U1.DI-.25 = (DI-.1);
  U1.DI-.24 = (DI-.0);
  U1.DI-.23 = (DI-.11);
  U1.DI-.22 = (DI-.10);
  U1.DI-.21 = (DI-.9);
  U1.DI-.20 = (DI-.8);
  U1.DI-.19 = (DI-.7);
  U1.DI-.18 = (DI-.6);
  U1.DI-.17 = (DI-.5);
  U1.DI-.16 = (DI-.4);
  U1.DI-.15 = (DI-.3);
  U1.DI-.14 = (DI-.2);
  U1.DI-.13 = (DI-.1);
  U1.DI-.12 = (DI-.0);
  U1.DI-.59 = (DI-.11);
  U1.DI-.58 = (DI-.10);
  U1.DI-.57 = (DI-.9);
  U1.DI-.56 = (DI-.8);
  U1.DI-.55 = (DI-.7);
  U1.DI-.54 = (DI-.6);
  U1.DI-.53 = (DI-.5);
  U1.DI-.52 = (DI-.4);
  U1.DI-.51 = (DI-.3);
  U1.DI-.50 = (DI-.2);
```

```
U1.DI-.49 = (DI-.1);
U1.DI-.48 = (DI-.0);
U1.DI-.47 = (DI-.11);
U1.DI-.46 = (DI-.10);
U1.DI-.45 = (DI-.9);
U1.DI-.44 = (DI-.8);
U1.DI-.43 = (DI-.7);
U1.DI-.42 = (DI-.6);
U1.DI-.41 = (DI-.5);
U1.DI-.40 = (DI-.4);
U1.DI-.39 = (DI-.3);
U1.DI-.38 = (DI-.2);
U1.DI-.37 = (DI-.1);
U1.DI-.36 = (DI-.0);
U1.OEN-.6 = (U1.SCK-);
U1.OEN-.8 = (U1.SCK-);
U1.OEN-.0 = (U1.SCK-);
U1.OEN-.5 = (U1.SCK-);
U1.OEN-.2 = (U1.SCK-);
U1.OEN-.1 = (U1.SCK-);
U1.OEN-.10 = (U1.SCK-);
U1.OEN-.11 = (U1.SCK-);
U1.OEN-.13 = (U1.SCK-);
U1.OEN-.9 = (U1.SCK-);
U1.OEN-.7 = (U1.SCK-);
U1.OEN-.14 = (U1.SCK-);
U1.OEN-.12 = (U1.SCK-);
U1.OEN-.4 = (U1.SCK-);
U1.OEN-.3 = (U1.SCK-);
DO-.11 = (U0.D0-.11);
DO-.10 = (U0.D0-.10);
DO-.9 = (U0.D0-.9);
DO-.8 = (U0.D0-.8);
DO-.7 = (U0.D0-.7);
DO-.6 = (U0.D0-.6);
DO-.5 = (U0.D0-.5);
DO-.4 = (U0.D0-.4);
DO-.3 = (U0.D0-.3);
DO-.2 = (U0.D0-.2);
DO-.1 = (U0.D0-.1);
DO-.0 = (U0.D0-.0);
DO-.59 = (U0.D4-.11);
DO-.58 = (U0.D4-.10);
DO-.57 = (U0.D4-.9);
DO-.56 = (U0.D4-.8);
DO-.55 = (U0.D4-.7);
DO-.54 = (U0.D4-.6);
DO-.53 = (U0.D4-.5);
DO-.52 = (U0.D4-.4);
DO-.51 = (U0.D4-.3);
DO-.50 = (U0.D4-.2);
DO-.49 = (U0.D4-.1);
DO-.48 = (U0.D4-.0);
DO-.23 = (U0.D1-.11);
DO-.22 = (U0.D1-.10);
DO-.21 = (U0.D1-.9);
DO-.20 = (U0.D1-.8);
DO-.19 = (U0.D1-.7);
DO-.18 = (U0.D1-.6);
DO-.17 = (U0.D1-.5);
DO-.16 = (U0.D1-.4);
DO-.15 = (U0.D1-.3);
DO-.14 = (U0.D1-.2);
DO-.13 = (U0.D1-.1);
DO-.12 = (U0.D1-.0);
DO-.47 = (U0.D3-.11);
DO-.46 = (U0.D3-.10);
DO-.45 = (U0.D3-.9);
DO-.44 = (U0.D3-.8);
DO-.43 = (U0.D3-.7);
DO-.42 = (U0.D3-.6);
DO-.41 = (U0.D3-.5);
DO-.40 = (U0.D3-.4);
DO-.39 = (U0.D3-.3);
```

```
    DO-.38 = (U0.D3-.2);
    DO-.37 = (U0.D3-.1);
    DO-.36 = (U0.D3-.0);
    DO-.35 = (U0.D2-.11);
    DO-.34 = (U0.D2-.10);
    DO-.33 = (U0.D2-.9);
    DO-.32 = (U0.D2-.8);
    DO-.31 = (U0.D2-.7);
    DO-.30 = (U0.D2-.6);
    DO-.29 = (U0.D2-.5);
    DO-.28 = (U0.D2-.4);
    DO-.27 = (U0.D2-.3);
    DO-.26 = (U0.D2-.2);
    DO-.25 = (U0.D2-.1);
    DO-.24 = (U0.D2-.0);
    U1.WBS-.5 = (W1E-);
    U1.WBS-.4 = (W1E-);
    U1.WBS-.3 = (W1E-);
    U0.S-.1 = (W1E-);
    U1.WBS-.13 = (W4E-);
    U1.WBS-.12 = (W4E-);
    U1.WBS-.14 = (W4E-);
    U0.S-.4 = (W4E-);
    U1.WBS-.2 = (W0E-);
    U1.WBS-.0 = (W0E-);
    U1.WBS-.1 = (W0E-);
    U0.S-.0 = (W0E-);
    U0.S-.2 = (W2E-);
    U0.S-.3 = (W3E-);
    U1.WBS-.11 = (W3E-);
    U1.WBS-.9 = (W3E-);
    U1.WBS-.7 = (W2E-);

  /* type converters *********************/

ANNOTATIONS
{
  BUS BUS_TYPE = "DOT";
}

END MODULE;


/* * * * * * *  Contents of NET file CMEMDECV1.NET  * * * * * * */

/*****************************************************/
/*  Netlist copyright (C) 1989 LSI Logic Corporation  */
/*****************************************************/

MODULE CMEMDECV1;

INPUTS      CS_,OPR,PA0,PA1,PA2,WR_;
OUTPUTS     W0E,W1E,W2E,W3E,W4E,WE;

LEVEL FUNCTION;
DEFINE
  /* implicit connectors *******************/

    W2E- = (W2E);
    W1E- = (W1E);
    W3E- = (W3E);
    PA0- = (PA0);
    WE- = (WE);
    WR_- = (WR_);
    W4E- = (W4E);
    PA2- = (PA2);
    CS_- = (CS_);
    OPR- = (OPR);
    W0E- = (W0E);
    PA1- = (PA1);
```

```
/* part instances ***************************/

  M28(W2E--Z) = N1B(M16.Z--A);
  M27(W1E--Z) = N1B(M19.Z--A);
  M4(M4.Z--Z) = N1B(PA1--A);
  M29(W3E--Z) = N1B(M22.Z--A);
  M3(M3.Z--Z) = N1B(PA0--A);
  M20(M20.Z--Z) = AND2B(PA0--A,PA1--B);
  M22(M22.Z--Z) = ND3B(M9.Z--C,M8.Z--B,M20.Z--A);
  M25(WE--Z) = N1B(M24.Z--A);
  M23(M23.Z--Z) = N1B(WR_--A);
  M30(W4E--Z) = N1B(M13.Z--A);
  M13(M13.Z--Z) = ND3B(M9.Z--C,M12.Z--B,M5.Z--A);
  M12(M12.Z--Z) = AND2B(PA2--A,M7.Z--B);
  M6(M6.Z--Z) = N1B(PA2--A);
  M8(M8.Z--Z) = AND2C(M7.Z--B,M6.Z--A);
  M7(M7.Z--Z) = N1B(CS_--A);
  M24(M24.Z--Z) = ND3B(M9.Z--C,M23.Z--A,M7.Z--B);
  M9(M9.Z--Z) = N1C(OPR--A);
  M26(W0E--Z) = N1B(M10.Z--A);
  M10(M10.Z--Z) = ND3B(M9.Z--C,M8.Z--B,M5.Z--A);
  M5(M5.Z--Z) = AND2B(M3.Z--A,M4.Z--B);
  M17(M17.Z--Z) = AND2B(PA0--A,M4.Z--B);
  M19(M19.Z--Z) = ND3B(M9.Z--C,M8.Z--B,M17.Z--A);
  M16(M16.Z--Z) = ND3B(M9.Z--C,M8.Z--B,M14.Z--A);
  M14(M14.Z--Z) = AND2B(PA1--B,M3.Z--A);


/* extractors ******************************/


/* type converters *********************/

ANNOTATIONS
{
  BUS BUS_TYPE = "DOT";
}

END MODULE;


/* * * * * * *  Contents of NET file PDMX1.NET  * * * * * * */

/******************************************************/
/*  Netlist copyright (C) 1989 LSI Logic Corporation  */
/******************************************************/

MODULE PDMX1;

INPUTS       CLRXAU,CLRYAU,CNVL.12,CNVL.11,CNVL.10,CNVL.9,CNVL.8,
             CNVL.7,CNVL.6,CNVL.5,CNVL.4,CNVL.3,CNVL.2,CNVL.1,
             CNVL.0,DUP,EENYAU,ENXAU,FRSTROW,INCY,LSTROW,LSTROW_1,
             PD2.15,PD2.14,PD2.13,PD2.12,PD2.11,PD2.10,PD2.9,PD2.8,
             PD2.7,PD2.6,PD2.5,PD2.4,PD2.3,PD2.2,PD2.1,PD2.0,
             PDO1.11,PDO1.10,PDO1.9,PDO1.8,PDO1.7,PDO1.6,PDO1.5,
             PDO1.4,PDO1.3,PDO1.2,PDO1.1,PDO1.0,SCNDROW,SE,SEL00,
             SEL01,SPR.1,SPR.0,XINT_GT_1,YINCEN,YINT_GT_1;
OUTPUTS      PDO.15,PDO.14,PDO.13,PDO.12,PDO.11,PDO.10,PDO.9,PDO.8,
             PDO.7,PDO.6,PDO.5,PDO.4,PDO.3,PDO.2,PDO.1,PDO.0;

LEVEL FUNCTION;
DEFINE
 /* implicit connectors *******************/

  DUP- = (DUP);
  LSTROW_1- = (LSTROW_1);
  EENYAU- = (EENYAU);
  CLRXAU- = (CLRXAU);
  ENXAU- = (ENXAU);
  FRSTROW- = (FRSTROW);
  CLRYAU- = (CLRYAU);
```

```
YINCEN- = (YINCEN);
XINT_GT_1- = (XINT_GT_1);
SE- = (SE);
SCNDROW- = (SCNDROW);
PD2-.15 = (PD2.15);
PD2-.14 = (PD2.14);
PD2-.13 = (PD2.13);
PD2-.12 = (PD2.12);
PD2-.11 = (PD2.11);
PD2-.10 = (PD2.10);
PD2-.9 = (PD2.9);
PD2-.8 = (PD2.8);
PD2-.7 = (PD2.7);
PD2-.6 = (PD2.6);
PD2-.5 = (PD2.5);
PD2-.4 = (PD2.4);
PD2-.3 = (PD2.3);
PD2-.2 = (PD2.2);
PD2-.1 = (PD2.1);
PD2-.0 = (PD2.0);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
M-0 = (NC/0/);
M-1 = (NC/0/);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
SEL01- = (SEL01);
SEL00- = (SEL00);
LSTROW- = (LSTROW);
INCY- = (INCY);
SPR-.1 = (SPR.1);
SPR-.0 = (SPR.0);
YINT_GT_1- = (YINT_GT_1);


/* part instances ***************************/

U0.15(PDO-.15=Z) = MUX41B(U0.D0-.15=D0,PD2-.15=D1,U0.D2-.15=D2,
       U0.D3-.15=D3,SEL01-=B,SEL00-=A);
```

```
U0.14(PDO-.14=Z) = MUX41B(U0.D0-.14=D0,PD2-.14=D1,U0.D2-.14=D2,
        U0.D3-.14=D3,SEL01-=B,SEL00-=A);
U0.13(PDO-.13=Z) = MUX41B(U0.D0-.13=D0,PD2-.13=D1,U0.D2-.13=D2,
        U0.D3-.13=D3,SEL01-=B,SEL00-=A);
U0.12(PDO-.12=Z) = MUX41B(U0.D0-.12=D0,PD2-.12=D1,U0.D2-.12=D2,
        U0.D3-.12=D3,SEL01-=B,SEL00-=A);
U0.11(PDO-.11=Z) = MUX41B(U0.D0-.11=D0,PD2-.11=D1,U0.D2-.11=D2,
        U0.D3-.11=D3,SEL01-=B,SEL00-=A);
U0.10(PDO-.10=Z) = MUX41B(U0.D0-.10=D0,PD2-.10=D1,U0.D2-.10=D2,
        U0.D3-.10=D3,SEL01-=B,SEL00-=A);
U0.9(PDO-.9=Z) = MUX41B(U0.D0-.9=D0,PD2-.9=D1,U0.D2-.9=D2,
        U0.D3-.9=D3,SEL01-=B,SEL00-=A);
U0.8(PDO-.8=Z) = MUX41B(U0.D0-.8=D0,PD2-.8=D1,U0.D2-.8=D2,
        U0.D3-.8=D3,SEL01-=B,SEL00-=A);
U0.7(PDO-.7=Z) = MUX41B(U0.D0-.7=D0,PD2-.7=D1,U0.D2-.7=D2,
        U0.D3-.7=D3,SEL01-=B,SEL00-=A);
U0.6(PDO-.6=Z) = MUX41B(U0.D0-.6=D0,PD2-.6=D1,U0.D2-.6=D2,
        U0.D3-.6=D3,SEL01-=B,SEL00-=A);
U0.5(PDO-.5=Z) = MUX41B(U0.D0-.5=D0,PD2-.5=D1,U0.D2-.5=D2,
        U0.D3-.5=D3,SEL01-=B,SEL00-=A);
U0.4(PDO-.4=Z) = MUX41B(U0.D0-.4=D0,PD2-.4=D1,U0.D2-.4=D2,
        U0.D3-.4=D3,SEL01-=B,SEL00-=A);
U0.3(PDO-.3=Z) = MUX41B(U0.D0-.3=D0,PD2-.3=D1,U0.D2-.3=D2,
        U0.D3-.3=D3,SEL01-=B,SEL00-=A);
U0.2(PDO-.2=Z) = MUX41B(U0.D0-.2=D0,PD2-.2=D1,U0.D2-.2=D2,
        U0.D3-.2=D3,SEL01-=B,SEL00-=A);
U0.1(PDO-.1=Z) = MUX41B(U0.D0-.1=D0,PD2-.1=D1,U0.D2-.1=D2,
        U0.D3-.1=D3,SEL01-=B,SEL00-=A);
U0.0(PDO-.0=Z) = MUX41B(U0.D0-.0=D0,PD2-.0=D1,U0.D2-.0=D2,
        U0.D3-.0=D3,SEL01-=B,SEL00-=A);


/* extractors *******************************/

U0.D2-.8 = (DUP-);
U0.D2-.12 = (LSTROW_1-);
U0.D2-.4 = (EENYAU-);
U0.D2-.0 = (CLRXAU-);
U0.D2-.1 = (ENXAU-);
U0.D2-.10 = (FRSTROW-);
U0.D2-.3 = (CLRYAU-);
U0.D2-.5 = (YINCEN-);
U0.D2-.2 = (XINT_GT_1-);
U0.D2-.9 = (SE-);
U0.D2-.11 = (SCNDROW-);
U0.D3-.11 = (PDO1-.11);
U0.D3-.10 = (PDO1-.10);
U0.D3-.9 = (PDO1-.9);
U0.D3-.8 = (PDO1-.8);
U0.D3-.7 = (PDO1-.7);
U0.D3-.6 = (PDO1-.6);
U0.D3-.5 = (PDO1-.5);
U0.D3-.4 = (PDO1-.4);
U0.D3-.3 = (PDO1-.3);
U0.D3-.2 = (PDO1-.2);
U0.D3-.1 = (PDO1-.1);
U0.D3-.0 = (PDO1-.0);
U0.D3-.12 = (M-1);
U0.D3-.13 = (M-1);
U0.D0-.12 = (CNVL-.12);
U0.D0-.11 = (CNVL-.11);
U0.D0-.10 = (CNVL-.10);
U0.D0-.9 = (CNVL-.9);
U0.D0-.8 = (CNVL-.8);
U0.D0-.7 = (CNVL-.7);
U0.D0-.6 = (CNVL-.6);
U0.D0-.5 = (CNVL-.5);
U0.D0-.4 = (CNVL-.4);
U0.D0-.3 = (CNVL-.3);
U0.D0-.2 = (CNVL-.2);
U0.D0-.1 = (CNVL-.1);
U0.D0-.0 = (CNVL-.0);
U0.D0-.14 = (M-0);
U0.D0-.13 = (M-0);
```

```
    U0.D0-.15 = (M-0);
    U0.D3-.14 = (M-1);
    U0.D3-.15 = (M-1);
    U0.D2-.13 = (LSTROW-);
    U0.D2-.6 = (INCY-);
    U0.D2-.14 = (M-2);
    SPR-.0 = (M-2);
    SPR-.1 = (M-3);
    U0.D2-.15 = (M-3);
    U0.D2-.7 = (YINT_GT_1-);


  /* type converters ********************/

ANNOTATIONS
{
  BUS BUS_TYPE = "DOT";
}

END MODULE;



/* * * * * * *  Contents of NET file CMEM.NET  * * * * * * */

/*****************************************************/
/*  Netlist copyright (C) 1989 LSI Logic Corporation  */
/*****************************************************/


MODULE CMEM;

INPUTS      ADDR.3,ADDR.2,ADDR.1,ADDR.0,ALE,CP,CS_,PA.6,PA.5,PA.4,
            PA.3,PA.2,PA.1,PA.0,PDI.11,PDI.10,PDI.9,PDI.8,PDI.7,
            PDI.6,PDI.5,PDI.4,PDI.3,PDI.2,PDI.1,PDI.0,RESET_,TST,
            WAIT,WR_;
OUTPUTS     DO.59,DO.58,DO.57,DO.56,DO.55,DO.54,DO.53,DO.52,DO.51,
            DO.50,DO.49,DO.48,DO.47,DO.46,DO.45,DO.44,DO.43,DO.42,
            DO.41,DO.40,DO.39,DO.38,DO.37,DO.36,DO.35,DO.34,DO.33,
            DO.32,DO.31,DO.30,DO.29,DO.28,DO.27,DO.26,DO.25,DO.24,
            DO.23,DO.22,DO.21,DO.20,DO.19,DO.18,DO.17,DO.16,DO.15,
            DO.14,DO.13,DO.12,DO.11,DO.10,DO.9,DO.8,DO.7,DO.6,
            DO.5,DO.4,DO.3,DO.2,DO.1,DO.0,PDO1.11,PDO1.10,PDO1.9,
            PDO1.8,PDO1.7,PDO1.6,PDO1.5,PDO1.4,PDO1.3,PDO1.2,
            PDO1.1,PDO1.0;

LEVEL FUNCTION;
DEFINE
  /* implicit connectors *******************/

    WR_- = (WR_);
    TST- = (TST);
    WAIT- = (WAIT);
    CP- = (CP);
    DO-.59 = (DO.59);
    DO-.58 = (DO.58);
    DO-.57 = (DO.57);
    DO-.56 = (DO.56);
    DO-.55 = (DO.55);
    DO-.54 = (DO.54);
    DO-.53 = (DO.53);
    DO-.52 = (DO.52);
    DO-.51 = (DO.51);
    DO-.50 = (DO.50);
    DO-.49 = (DO.49);
    DO-.48 = (DO.48);
    DO-.47 = (DO.47);
    DO-.46 = (DO.46);
    DO-.45 = (DO.45);
    DO-.44 = (DO.44);
    DO-.43 = (DO.43);
    DO-.42 = (DO.42);
    DO-.41 = (DO.41);
```

```
DO-.40 = (DO.40);
DO-.39 = (DO.39);
DO-.38 = (DO.38);
DO-.37 = (DO.37);
DO-.36 = (DO.36);
DO-.35 = (DO.35);
DO-.34 = (DO.34);
DO-.33 = (DO.33);
DO-.32 = (DO.32);
DO-.31 = (DO.31);
DO-.30 = (DO.30);
DO-.29 = (DO.29);
DO-.28 = (DO.28);
DO-.27 = (DO.27);
DO-.26 = (DO.26);
DO-.25 = (DO.25);
DO-.24 = (DO.24);
DO-.23 = (DO.23);
DO-.22 = (DO.22);
DO-.21 = (DO.21);
DO-.20 = (DO.20);
DO-.19 = (DO.19);
DO-.18 = (DO.18);
DO-.17 = (DO.17);
DO-.16 = (DO.16);
DO-.15 = (DO.15);
DO-.14 = (DO.14);
DO-.13 = (DO.13);
DO-.12 = (DO.12);
DO-.11 = (DO.11);
DO-.10 = (DO.10);
DO-.9 = (DO.9);
DO-.8 = (DO.8);
DO-.7 = (DO.7);
DO-.6 = (DO.6);
DO-.5 = (DO.5);
DO-.4 = (DO.4);
DO-.3 = (DO.3);
DO-.2 = (DO.2);
DO-.1 = (DO.1);
DO-.0 = (DO.0);
RESET_- = (RESET_);
BRESET_- = (BRESET_);
BRESET_- = (BRESET_);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
ADDR-.3 = (ADDR.3);
ADDR-.2 = (ADDR.2);
ADDR-.1 = (ADDR.1);
ADDR-.0 = (ADDR.0);
ALE- = (ALE);
CS_- = (CS_);
CS_- = (CS_);
CS_- = (CS_);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
```

```
 PDI-.1 = (PDI.1);
 PDI-.0 = (PDI.0);
 PA-.6 = (PA.6);
 PA-.5 = (PA.5);
 PA-.4 = (PA.4);
 PA-.3 = (PA.3);
 PA-.2 = (PA.2);
 PA-.1 = (PA.1);
 PA-.0 = (PA.0);


/* part instances ***************************/

 U5(BRESET_-=Z) = B3A(RESET_-=A);
 U1.59(DO-.59=Q) = FD2SA(WAIT-=TE,DO-.59=TI,CP-=CP,U2.DO-.59=D,
        BRESET_-=CD);
 U1.58(DO-.58=Q) = FD2SA(WAIT-=TE,DO-.58=TI,CP-=CP,U2.DO-.58=D,
        BRESET_-=CD);
 U1.57(DO-.57=Q) = FD2SA(WAIT-=TE,DO-.57=TI,CP-=CP,U2.DO-.57=D,
        BRESET_-=CD);
 U1.56(DO-.56=Q) = FD2SA(WAIT-=TE,DO-.56=TI,CP-=CP,U2.DO-.56=D,
        BRESET_-=CD);
 U1.55(DO-.55=Q) = FD2SA(WAIT-=TE,DO-.55=TI,CP-=CP,U2.DO-.55=D,
        BRESET_-=CD);
 U1.54(DO-.54=Q) = FD2SA(WAIT-=TE,DO-.54=TI,CP-=CP,U2.DO-.54=D,
        BRESET_-=CD);
 U1.53(DO-.53=Q) = FD2SA(WAIT-=TE,DO-.53=TI,CP-=CP,U2.DO-.53=D,
        BRESET_-=CD);
 U1.52(DO-.52=Q) = FD2SA(WAIT-=TE,DO-.52=TI,CP-=CP,U2.DO-.52=D,
        BRESET_-=CD);
 U1.51(DO-.51=Q) = FD2SA(WAIT-=TE,DO-.51=TI,CP-=CP,U2.DO-.51=D,
        BRESET_-=CD);
 U1.50(DO-.50=Q) = FD2SA(WAIT-=TE,DO-.50=TI,CP-=CP,U2.DO-.50=D,
        BRESET_-=CD);
 U1.49(DO-.49=Q) = FD2SA(WAIT-=TE,DO-.49=TI,CP-=CP,U2.DO-.49=D,
        BRESET_-=CD);
 U1.48(DO-.48=Q) = FD2SA(WAIT-=TE,DO-.48=TI,CP-=CP,U2.DO-.48=D,
        BRESET_-=CD);
 U1.47(DO-.47=Q) = FD2SA(WAIT-=TE,DO-.47=TI,CP-=CP,U2.DO-.47=D,
        BRESET_-=CD);
 U1.46(DO-.46=Q) = FD2SA(WAIT-=TE,DO-.46=TI,CP-=CP,U2.DO-.46=D,
        BRESET_-=CD);
 U1.45(DO-.45=Q) = FD2SA(WAIT-=TE,DO-.45=TI,CP-=CP,U2.DO-.45=D,
        BRESET_-=CD);
 U1.44(DO-.44=Q) = FD2SA(WAIT-=TE,DO-.44=TI,CP-=CP,U2.DO-.44=D,
        BRESET_-=CD);
 U1.43(DO-.43=Q) = FD2SA(WAIT-=TE,DO-.43=TI,CP-=CP,U2.DO-.43=D,
        BRESET_-=CD);
 U1.42(DO-.42=Q) = FD2SA(WAIT-=TE,DO-.42=TI,CP-=CP,U2.DO-.42=D,
        BRESET_-=CD);
 U1.41(DO-.41=Q) = FD2SA(WAIT-=TE,DO-.41=TI,CP-=CP,U2.DO-.41=D,
        BRESET_-=CD);
 U1.40(DO-.40=Q) = FD2SA(WAIT-=TE,DO-.40=TI,CP-=CP,U2.DO-.40=D,
        BRESET_-=CD);
 U1.39(DO-.39=Q) = FD2SA(WAIT-=TE,DO-.39=TI,CP-=CP,U2.DO-.39=D,
        BRESET_-=CD);
 U1.38(DO-.38=Q) = FD2SA(WAIT-=TE,DO-.38=TI,CP-=CP,U2.DO-.38=D,
        BRESET_-=CD);
 U1.37(DO-.37=Q) = FD2SA(WAIT-=TE,DO-.37=TI,CP-=CP,U2.DO-.37=D,
        BRESET_-=CD);
 U1.36(DO-.36=Q) = FD2SA(WAIT-=TE,DO-.36=TI,CP-=CP,U2.DO-.36=D,
        BRESET_-=CD);
 U1.35(DO-.35=Q) = FD2SA(WAIT-=TE,DO-.35=TI,CP-=CP,U2.DO-.35=D,
        BRESET_-=CD);
 U1.34(DO-.34=Q) = FD2SA(WAIT-=TE,DO-.34=TI,CP-=CP,U2.DO-.34=D,
        BRESET_-=CD);
 U1.33(DO-.33=Q) = FD2SA(WAIT-=TE,DO-.33=TI,CP-=CP,U2.DO-.33=D,
        BRESET_-=CD);
 U1.32(DO-.32=Q) = FD2SA(WAIT-=TE,DO-.32=TI,CP-=CP,U2.DO-.32=D,
        BRESET_-=CD);
 U1.31(DO-.31=Q) = FD2SA(WAIT-=TE,DO-.31=TI,CP-=CP,U2.DO-.31=D,
        BRESET_-=CD);
 U1.30(DO-.30=Q) = FD2SA(WAIT-=TE,DO-.30=TI,CP-=CP,U2.DO-.30=D,
        BRESET_-=CD);
```

```
U1.29(DO-.29=Q) = FD2SA(WAIT-=TE,DO-.29=TI,CP-=CP,U2.DO-.29=D,
        BRESET_-=CD);
U1.28(DO-.28=Q) = FD2SA(WAIT-=TE,DO-.28=TI,CP-=CP,U2.DO-.28=D,
        BRESET_-=CD);
U1.27(DO-.27=Q) = FD2SA(WAIT-=TE,DO-.27=TI,CP-=CP,U2.DO-.27=D,
        BRESET_-=CD);
U1.26(DO-.26=Q) = FD2SA(WAIT-=TE,DO-.26=TI,CP-=CP,U2.DO-.26=D,
        BRESET_-=CD);
U1.25(DO-.25=Q) = FD2SA(WAIT-=TE,DO-.25=TI,CP-=CP,U2.DO-.25=D,
        BRESET_-=CD);
U1.24(DO-.24=Q) = FD2SA(WAIT-=TE,DO-.24=TI,CP-=CP,U2.DO-.24=D,
        BRESET_-=CD);
U1.23(DO-.23=Q) = FD2SA(WAIT-=TE,DO-.23=TI,CP-=CP,U2.DO-.23=D,
        BRESET_-=CD);
U1.22(DO-.22=Q) = FD2SA(WAIT-=TE,DO-.22=TI,CP-=CP,U2.DO-.22=D,
        BRESET_-=CD);
U1.21(DO-.21=Q) = FD2SA(WAIT-=TE,DO-.21=TI,CP-=CP,U2.DO-.21=D,
        BRESET_-=CD);
U1.20(DO-.20=Q) = FD2SA(WAIT-=TE,DO-.20=TI,CP-=CP,U2.DO-.20=D,
        BRESET_-=CD);
U1.19(DO-.19=Q) = FD2SA(WAIT-=TE,DO-.19=TI,CP-=CP,U2.DO-.19=D,
        BRESET_-=CD);
U1.18(DO-.18=Q) = FD2SA(WAIT-=TE,DO-.18=TI,CP-=CP,U2.DO-.18=D,
        BRESET_-=CD);
U1.17(DO-.17=Q) = FD2SA(WAIT-=TE,DO-.17=TI,CP-=CP,U2.DO-.17=D,
        BRESET_-=CD);
U1.16(DO-.16=Q) = FD2SA(WAIT-=TE,DO-.16=TI,CP-=CP,U2.DO-.16=D,
        BRESET_-=CD);
U1.15(DO-.15=Q) = FD2SA(WAIT-=TE,DO-.15=TI,CP-=CP,U2.DO-.15=D,
        BRESET_-=CD);
U1.14(DO-.14=Q) = FD2SA(WAIT-=TE,DO-.14=TI,CP-=CP,U2.DO-.14=D,
        BRESET_-=CD);
U1.13(DO-.13=Q) = FD2SA(WAIT-=TE,DO-.13=TI,CP-=CP,U2.DO-.13=D,
        BRESET_-=CD);
U1.12(DO-.12=Q) = FD2SA(WAIT-=TE,DO-.12=TI,CP-=CP,U2.DO-.12=D,
        BRESET_-=CD);
U1.11(DO-.11=Q) = FD2SA(WAIT-=TE,DO-.11=TI,CP-=CP,U2.DO-.11=D,
        BRESET_-=CD);
U1.10(DO-.10=Q) = FD2SA(WAIT-=TE,DO-.10=TI,CP-=CP,U2.DO-.10=D,
        BRESET_-=CD);
U1.9(DO-.9=Q) = FD2SA(WAIT-=TE,DO-.9=TI,CP-=CP,U2.DO-.9=D,
        BRESET_-=CD);
U1.8(DO-.8=Q) = FD2SA(WAIT-=TE,DO-.8=TI,CP-=CP,U2.DO-.8=D,
        BRESET_-=CD);
U1.7(DO-.7=Q) = FD2SA(WAIT-=TE,DO-.7=TI,CP-=CP,U2.DO-.7=D,
        BRESET_-=CD);
U1.6(DO-.6=Q) = FD2SA(WAIT-=TE,DO-.6=TI,CP-=CP,U2.DO-.6=D,
        BRESET_-=CD);
U1.5(DO-.5=Q) = FD2SA(WAIT-=TE,DO-.5=TI,CP-=CP,U2.DO-.5=D,
        BRESET_-=CD);
U1.4(DO-.4=Q) = FD2SA(WAIT-=TE,DO-.4=TI,CP-=CP,U2.DO-.4=D,
        BRESET_-=CD);
U1.3(DO-.3=Q) = FD2SA(WAIT-=TE,DO-.3=TI,CP-=CP,U2.DO-.3=D,
        BRESET_-=CD);
U1.2(DO-.2=Q) = FD2SA(WAIT-=TE,DO-.2=TI,CP-=CP,U2.DO-.2=D,
        BRESET_-=CD);
U1.1(DO-.1=Q) = FD2SA(WAIT-=TE,DO-.1=TI,CP-=CP,U2.DO-.1=D,
        BRESET_-=CD);
U1.0(DO-.0=Q) = FD2SA(WAIT-=TE,DO-.0=TI,CP-=CP,U2.DO-.0=D,
        BRESET_-=CD);
U0(U0.Z-=Z) = OR2C(ALE-=A,CS_-=B);
U4(U4.Z-.3=Z.3,U4.Z-.2=Z.2,U4.Z-.1=Z.1,U4.Z-.0=Z.0) = MUX2X1W4(
        ADDR-.3=B.3,ADDR-.2=B.2,ADDR-.1=B.1,ADDR-.0=B.0,CS_-=S,
        U4.A-.3=A.3,U4.A-.2=A.2,U4.A-.1=A.1,U4.A-.0=A.0);
U2(U2.DO-.59=DO.59,U2.DO-.58=DO.58,U2.DO-.57=DO.57,U2.DO-.56=DO.56,
        U2.DO-.55=DO.55,U2.DO-.54=DO.54,U2.DO-.53=DO.53,
        U2.DO-.52=DO.52,U2.DO-.51=DO.51,U2.DO-.50=DO.50,
        U2.DO-.49=DO.49,U2.DO-.48=DO.48,U2.DO-.47=DO.47,
        U2.DO-.46=DO.46,U2.DO-.45=DO.45,U2.DO-.44=DO.44,
        U2.DO-.43=DO.43,U2.DO-.42=DO.42,U2.DO-.41=DO.41,
        U2.DO-.40=DO.40,U2.DO-.39=DO.39,U2.DO-.38=DO.38,
        U2.DO-.37=DO.37,U2.DO-.36=DO.36,U2.DO-.35=DO.35,
        U2.DO-.34=DO.34,U2.DO-.33=DO.33,U2.DO-.32=DO.32,
```

```
        U2.DO-.31=DO.31,U2.DO-.30=DO.30,U2.DO-.29=DO.29,
        U2.DO-.28=DO.28,U2.DO-.27=DO.27,U2.DO-.26=DO.26,
        U2.DO-.25=DO.25,U2.DO-.24=DO.24,U2.DO-.23=DO.23,
        U2.DO-.22=DO.22,U2.DO-.21=DO.21,U2.DO-.20=DO.20,
        U2.DO-.19=DO.19,U2.DO-.18=DO.18,U2.DO-.17=DO.17,
        U2.DO-.16=DO.16,U2.DO-.15=DO.15,U2.DO-.14=DO.14,
        U2.DO-.13=DO.13,U2.DO-.12=DO.12,U2.DO-.11=DO.11,
        U2.DO-.10=DO.10,U2.DO-.9=DO.9,U2.DO-.8=DO.8,U2.DO-.7=DO.7,
        U2.DO-.6=DO.6,U2.DO-.5=DO.5,U2.DO-.4=DO.4,U2.DO-.3=DO.3,
        U2.DO-.2=DO.2,U2.DO-.1=DO.1,U2.DO-.0=DO.0,PDO1-.11=PDO.11,
        PDO1-.10=PDO.10,PDO1-.9=PDO.9,PDO1-.8=PDO.8,PDO1-.7=PDO.7,
        PDO1-.6=PDO.6,PDO1-.5=PDO.5,PDO1-.4=PDO.4,PDO1-.3=PDO.3,
        PDO1-.2=PDO.2,PDO1-.1=PDO.1,PDO1-.0=PDO.0) = MEM16X60(
        U0.Z-=ALE,U4.Z-.3=ADR.3,U4.Z-.2=ADR.2,U4.Z-.1=ADR.1,
        U4.Z-.0=ADR.0,PDI-.11=DI.11,PDI-.10=DI.10,PDI-.9=DI.9,
        PDI-.8=DI.8,PDI-.7=DI.7,PDI-.6=DI.6,PDI-.5=DI.5,
        PDI-.4=DI.4,PDI-.3=DI.3,PDI-.2=DI.2,PDI-.1=DI.1,
        PDI-.0=DI.0,U3.W4E-=W4E,U3.W3E-=W3E,U3.W2E-=W2E,
        U3.W1E-=W1E,U3.W0E-=W0E,U3.WE-=WE);
  U3(U3.W4E-=W4E,U3.W3E-=W3E,U3.W2E-=W2E,U3.W1E-=W1E,U3.W0E-=W0E,
        U3.WE-=WE) = CMEMDECV1(U3.PA2-=PA2,U3.PA1-=PA1,U3.PA0-=PA0,
        WR_-=WR_,TST-=OPR,CS_-=CS_);

 /* extractors ******************************/

   PA-.2 = (U3.PA2-);
   PA-.1 = (U3.PA1-);
   PA-.6 = (U4.A-.3);
   PA-.5 = (U4.A-.2);
   PA-.4 = (U4.A-.1);
   PA-.3 = (U4.A-.0);
   PA-.0 = (U3.PA0-);

 /* type converters *********************/

ANNOTATIONS
{
  BUS BUS_TYPE = "DOT";
}

END MODULE;



/* * * * * * *  Contents of NET file CNV_V4.NET  * * * * * * */

/*******************************************************/
/*  Netlist copyright (C) 1989 LSI Logic Corporation   */
/*******************************************************/

MODULE CNV_V4;

INPUTS      ALE,CLRXAU,CLRYAU,CMAGEN,CMEM_CS_,COF_ADRIN.2,
            COF_ADRIN.1,COF_ADRIN.0,CP,DUP,ENXAU,ENYAU,EOC,
            FRSTROW,INT_GT_1IN,LIM,LSTROW,LSTROW_1,LS_1,MR_CS_,
            NOS.1,NOS.0,PA.6,PA.5,PA.4,PA.3,PA.2,PA.1,PA.0,PDI.15,
            PDI.14,PDI.13,PDI.12,PDI.11,PDI.10,PDI.9,PDI.8,PDI.7,
            PDI.6,PDI.5,PDI.4,PDI.3,PDI.2,PDI.1,PDI.0,PLR_CS_,PSE,
            PXL_EN,RC0.7,RC0.6,RC0.5,RC0.4,RC0.3,RC0.2,RC0.1,
            RC0.0,RC1.7,RC1.6,RC1.5,RC1.4,RC1.3,RC1.2,RC1.1,RC1.0,
            RC2.7,RC2.6,RC2.5,RC2.4,RC2.3,RC2.2,RC2.1,RC2.0,RC3.7,
            RC3.6,RC3.5,RC3.4,RC3.3,RC3.2,RC3.1,RC3.0,RC4.7,RC4.6,
            RC4.5,RC4.4,RC4.3,RC4.2,RC4.1,RC4.0,RESET_,S,SCNDCOL,
            SCNDROW,SE,SEL00,SEL01,SEL10,SEL11,SPR.1,SPR.0,SPRCYC,
            STB_I,TST,WAIT,WR_,XAU_HCS_,XAU_LCS_,XSCNIN,YADRSEL,
            YAU_HCS_,YAU_LCS_,YDWN,YINCEN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
```

```
            CNVL.4,CNVL.3,CNVL.2,CNVL.1,CNVL.0,DLY_POL,EOR,INCY,
            PDO.15,PDO.14,PDO.13,PDO.12,PDO.11,PDO.10,PDO.9,PDO.8,
            PDO.7,PDO.6,PDO.5,PDO.4,PDO.3,PDO.2,PDO.1,PDO.0,
            S_MODE,XINT_GT_1,YINT,YINTSND;

LEVEL FUNCTION;
DEFINE
  /* implicit connectors *******************/

    LIM- = (LIM);
    LS_1- = (LS_1);
    YINT- = (YINT);
    EOR- = (EOR);
    YINTSND- = (YINTSND);
    YAU_LCS_- = (YAU_LCS_);
    YAU_HCS_- = (YAU_HCS_);
    BMYL-.4 = (BMYL.4);
    BMYL-.3 = (BMYL.3);
    BMYL-.2 = (BMYL.2);
    BMYL-.1 = (BMYL.1);
    BMYL-.0 = (BMYL.0);
    YDWN- = (YDWN);
    YUP- = (YUP);
    COF_ADRIN-.2 = (COF_ADRIN.2);
    COF_ADRIN-.1 = (COF_ADRIN.1);
    COF_ADRIN-.0 = (COF_ADRIN.0);
    XAU_HCS_- = (XAU_HCS_);
    XAU_LCS_- = (XAU_LCS_);
    XSCNIN- = (XSCNIN);
    CLRXCNT_- = (CLRXCNT_);
    BRESET_- = (BRESET_);
    RESET_- = (RESET_);
    BRESET_- = (BRESET_);
    SCNDCOL- = (SCNDCOL);
    PSE- = (PSE);
    MR_CS_- = (MR_CS_);
    WR_- = (WR_);
    WR_- = (WR_);
    S_MODE- = (S_MODE);
    SEL10- = (SEL10);
    SEL11- = (SEL11);
    ROW_ORDER-.2 = (ROW_ORDER.2);
    ROW_ORDER-.1 = (ROW_ORDER.1);
    ROW_ORDER-.0 = (ROW_ORDER.0);
    ROW_ORDER-.2 = (ROW_ORDER.2);
    ROW_ORDER-.1 = (ROW_ORDER.1);
    ROW_ORDER-.0 = (ROW_ORDER.0);
    BRESET_- = (BRESET_);
    RC4-.7 = (RC4.7);
    RC4-.6 = (RC4.6);
    RC4-.5 = (RC4.5);
    RC4-.4 = (RC4.4);
    RC4-.3 = (RC4.3);
    RC4-.2 = (RC4.2);
    RC4-.1 = (RC4.1);
    RC4-.0 = (RC4.0);
    RC3-.7 = (RC3.7);
    RC3-.6 = (RC3.6);
    RC3-.5 = (RC3.5);
    RC3-.4 = (RC3.4);
    RC3-.3 = (RC3.3);
    RC3-.2 = (RC3.2);
    RC3-.1 = (RC3.1);
    RC3-.0 = (RC3.0);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC1-.7 = (RC1.7);
    RC1-.6 = (RC1.6);
```

```
RC1-.5 = (RC1.5);
RC1-.4 = (RC1.4);
RC1-.3 = (RC1.3);
RC1-.2 = (RC1.2);
RC1-.1 = (RC1.1);
RC1-.0 = (RC1.0);
RC0-.7 = (RC0.7);
RC0-.6 = (RC0.6);
RC0-.5 = (RC0.5);
RC0-.4 = (RC0.4);
RC0-.3 = (RC0.3);
RC0-.2 = (RC0.2);
RC0-.1 = (RC0.1);
RC0-.0 = (RC0.0);
STB_I- = (STB_I);
S- = (S);
LSTROW- = (LSTROW);
LSTROW- = (LSTROW);
LSTROW- = (LSTROW);
LSTROW_1- = (LSTROW_1);
LSTROW_1- = (LSTROW_1);
LSTROW_1- = (LSTROW_1);
SCNDROW- = (SCNDROW);
SCNDROW- = (SCNDROW);
SCNDROW- = (SCNDROW);
FRSTROW- = (FRSTROW);
FRSTROW- = (FRSTROW);
FRSTROW- = (FRSTROW);
SE- = (SE);
SE- = (SE);
DUP- = (DUP);
DUP- = (DUP);
P1_BUSY- = (P1_BUSY);
P1_BUSY- = (P1_BUSY);
P1_BUSY- = (P1_BUSY);
INCY- = (INCY);
INCY- = (INCY);
YINCEN- = (YINCEN);
YINCEN- = (YINCEN);
ENYAU- = (ENYAU);
ENYAU- = (ENYAU);
CLRYAU- = (CLRYAU);
CLRYAU- = (CLRYAU);
ENXAU- = (ENXAU);
MR-.4 = (MR.4);
MR-.3 = (MR.3);
MR-.2 = (MR.2);
MR-.1 = (MR.1);
MR-.0 = (MR.0);
INT_GT_1IN- = (INT_GT_1IN);
INT_GT_1IN- = (INT_GT_1IN);
XINT_GT_1- = (XINT_GT_1);
XINT_GT_1- = (XINT_GT_1);
CMAGEN- = (CMAGEN);
PXL_EN- = (PXL_EN);
PXL_EN- = (PXL_EN);
NOS-.1 = (NOS.1);
NOS-.0 = (NOS.0);
NOS-.1 = (NOS.1);
NOS-.0 = (NOS.0);
DLY_POL- = (DLY_POL);
DLY_POL- = (DLY_POL);
SPRCYC- = (SPRCYC);
SPRCYC- = (SPRCYC);
YADRSEL- = (YADRSEL);
EOC- = (EOC);
EOC- = (EOC);
CP- = (CP);
CP- = (CP);
CP- = (CP);
CP- = (CP);
BRESET_- = (BRESET_);
PDO1-.11 = (PDO1.11);
PDO1-.10 = (PDO1.10);
```

```
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
PDO1-.11 = (PDO1.11);
PDO1-.10 = (PDO1.10);
PDO1-.9 = (PDO1.9);
PDO1-.8 = (PDO1.8);
PDO1-.7 = (PDO1.7);
PDO1-.6 = (PDO1.6);
PDO1-.5 = (PDO1.5);
PDO1-.4 = (PDO1.4);
PDO1-.3 = (PDO1.3);
PDO1-.2 = (PDO1.2);
PDO1-.1 = (PDO1.1);
PDO1-.0 = (PDO1.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
```

```
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PA-.6 = (PA.6);
PA-.5 = (PA.5);
PA-.4 = (PA.4);
PA-.3 = (PA.3);
PA-.2 = (PA.2);
PA-.1 = (PA.1);
PA-.0 = (PA.0);
WR_- = (WR_);
CMEM_CS_- = (CMEM_CS_);
ALE- = (ALE);
TST- = (TST);
TST- = (TST);
TST- = (TST);
TST- = (TST);
BWAIT1- = (BWAIT1);
BWAIT0- = (BWAIT0);
BWAIT0- = (BWAIT0);
BWAIT0- = (BWAIT0);
WAIT- = (WAIT);
CP- = (CP);
BRESET_- = (BRESET_);
BWAIT1- = (BWAIT1);
BWAIT1- = (BWAIT1);
CP- = (CP);
CP- = (CP);
BRESET_- = (BRESET_);
ENXAU- = (ENXAU);
ENXAU- = (ENXAU);
CLRXAU- = (CLRXAU);
CLRXAU- = (CLRXAU);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
```

```
SEL00- = (SEL00);
SEL01- = (SEL01);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
PDO2-.15 = (PDO2.15);
PDO2-.14 = (PDO2.14);
PDO2-.13 = (PDO2.13);
PDO2-.12 = (PDO2.12);
PDO2-.11 = (PDO2.11);
PDO2-.10 = (PDO2.10);
PDO2-.9 = (PDO2.9);
PDO2-.8 = (PDO2.8);
PDO2-.7 = (PDO2.7);
PDO2-.6 = (PDO2.6);
PDO2-.5 = (PDO2.5);
PDO2-.4 = (PDO2.4);
PDO2-.3 = (PDO2.3);
PDO2-.2 = (PDO2.2);
PDO2-.1 = (PDO2.1);
PDO2-.0 = (PDO2.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
SPR-.1 = (SPR.1);
SPR-.0 = (SPR.0);
SPR-.1 = (SPR.1);
SPR-.0 = (SPR.0);
PLR_CS_- = (PLR_CS_);
WR_- = (WR_);
WR_- = (WR_);
BRESET_- = (BRESET_);
MR-.4 = (MR.4);
MR-.3 = (MR.3);
MR-.2 = (MR.2);
MR-.1 = (MR.1);
MR-.0 = (MR.0);
```

```
S_MODE- = (S_MODE);
S_MODE- = (S_MODE);
BRESET_- = (BRESET_);
BRESET_- = (BRESET_);
MR-.4 = (MR.4);
MR-.3 = (MR.3);
MR-.2 = (MR.2);
MR-.1 = (MR.1);
MR-.0 = (MR.0);
MR-.4 = (MR.4);
MR-.3 = (MR.3);
MR-.2 = (MR.2);
MR-.1 = (MR.1);
MR-.0 = (MR.0);
YSCNIN- = (YSCNIN);

/* part instances ***************************/

U7(BRESET_-=Z) = B3A(RESET_-=A);
U6(U6.Q-=Q) = FD2A(WAIT-=D,CP-=CP,BRESET_-=CD);
U8.1(U8.Z-.1=Z) = B3A(U6.Q-=A);
U8.0(U8.Z-.0=Z) = B3A(U6.Q-=A);
U4(PDO1-.11=PDO1.11,PDO1-.10=PDO1.10,PDO1-.9=PDO1.9,PDO1-.8=PDO1.8,
    PDO1-.7=PDO1.7,PDO1-.6=PDO1.6,PDO1-.5=PDO1.5,PDO1-.4=PDO1.4,
    PDO1-.3=PDO1.3,PDO1-.2=PDO1.2,PDO1-.1=PDO1.1,PDO1-.0=PDO1.0,
    U4.DO-.59=DO.59,U4.DO-.58=DO.58,U4.DO-.57=DO.57,
    U4.DO-.56=DO.56,U4.DO-.55=DO.55,U4.DO-.54=DO.54,
    U4.DO-.53=DO.53,U4.DO-.52=DO.52,U4.DO-.51=DO.51,
    U4.DO-.50=DO.50,U4.DO-.49=DO.49,U4.DO-.48=DO.48,
    U4.DO-.47=DO.47,U4.DO-.46=DO.46,U4.DO-.45=DO.45,
    U4.DO-.44=DO.44,U4.DO-.43=DO.43,U4.DO-.42=DO.42,
    U4.DO-.41=DO.41,U4.DO-.40=DO.40,U4.DO-.39=DO.39,
    U4.DO-.38=DO.38,U4.DO-.37=DO.37,U4.DO-.36=DO.36,
    U4.DO-.35=DO.35,U4.DO-.34=DO.34,U4.DO-.33=DO.33,
    U4.DO-.32=DO.32,U4.DO-.31=DO.31,U4.DO-.30=DO.30,
    U4.DO-.29=DO.29,U4.DO-.28=DO.28,U4.DO-.27=DO.27,
    U4.DO-.26=DO.26,U4.DO-.25=DO.25,U4.DO-.24=DO.24,
    U4.DO-.23=DO.23,U4.DO-.22=DO.22,U4.DO-.21=DO.21,
    U4.DO-.20=DO.20,U4.DO-.19=DO.19,U4.DO-.18=DO.18,
    U4.DO-.17=DO.17,U4.DO-.16=DO.16,U4.DO-.15=DO.15,
    U4.DO-.14=DO.14,U4.DO-.13=DO.13,U4.DO-.12=DO.12,
    U4.DO-.11=DO.11,U4.DO-.10=DO.10,U4.DO-.9=DO.9,
    U4.DO-.8=DO.8,U4.DO-.7=DO.7,U4.DO-.6=DO.6,U4.DO-.5=DO.5,
    U4.DO-.4=DO.4,U4.DO-.3=DO.3,U4.DO-.2=DO.2,U4.DO-.1=DO.1,
    U4.DO-.0=DO.0) = CMEM(U1.COF_ADR-.3=ADDR.3,
    U1.COF_ADR-.2=ADDR.2,U1.COF_ADR-.1=ADDR.1,
    U1.COF_ADR-.0=ADDR.0,BRESET_-=RESET_,CP-=CP,
    U4.PDI-.11=PDI.11,U4.PDI-.10=PDI.10,U4.PDI-.9=PDI.9,
    U4.PDI-.8=PDI.8,U4.PDI-.7=PDI.7,U4.PDI-.6=PDI.6,
    U4.PDI-.5=PDI.5,U4.PDI-.4=PDI.4,U4.PDI-.3=PDI.3,
    U4.PDI-.2=PDI.2,U4.PDI-.1=PDI.1,U4.PDI-.0=PDI.0,PA-.6=PA.6,
    PA-.5=PA.5,PA-.4=PA.4,PA-.3=PA.3,PA-.2=PA.2,PA-.1=PA.1,
    PA-.0=PA.0,WR_-=WR_,CMEM_CS_-=CS_,ALE-=ALE,TST-=TST,
    BWAIT1-=WAIT);
U1(U1.COF_ADR-.3=COF_ADR.3,U1.COF_ADR-.2=COF_ADR.2,
    U1.COF_ADR-.1=COF_ADR.1,U1.COF_ADR-.0=COF_ADR.0) =
    CMAGV2(U1.S_MODE-=S_MODE,U3.COF_ADR-.2=YCOF_ADR.2,
    U3.COF_ADR-.1=YCOF_ADR.1,U3.COF_ADR-.0=YCOF_ADR.0,
    U5.COF_ADR-.2=XCOF_ADR.2,U5.COF_ADR-.1=XCOF_ADR.1,
    U5.COF_ADR-.0=XCOF_ADR.0,INT_GT_1IN-=INT_GT_1IN,
    XINT_GT_1-=XGT1,CMAGEN-=CMAGEN,PXL_EN-=PXL_EN,NOS-.1=NOS.1,
    NOS-.0=NOS.0,DLY_POL-=DLY_POL,SPRCYC-=SPRCYC,YADRSEL-=YCOF_SEL,
    ENXAU-=ENXAU,EOC-=EOC,BWAIT1-=WAIT,CP-=CP,BRESET_-=RESET_);
U9(PDO-.15=PDO.15,PDO-.14=PDO.14,PDO-.13=PDO.13,PDO-.12=PDO.12,
    PDO-.11=PDO.11,PDO-.10=PDO.10,PDO-.9=PDO.9,PDO-.8=PDO.8,
    PDO-.7=PDO.7,PDO-.6=PDO.6,PDO-.5=PDO.5,PDO-.4=PDO.4,
    PDO-.3=PDO.3,PDO-.2=PDO.2,PDO-.1=PDO.1,PDO-.0=PDO.0)
    = PDMX1(PDO1-.11=PDO1.11,PDO1-.10=PDO1.10,PDO1-.9=PDO1.9,
    PDO1-.8=PDO1.8,PDO1-.7=PDO1.7,PDO1-.6=PDO1.6,PDO1-.5=PDO1.5,
    PDO1-.4=PDO1.4,PDO1-.3=PDO1.3,PDO1-.2=PDO1.2,PDO1-.1=PDO1.1,
    PDO1-.0=PDO1.0,SPR-.1=SPR.1,SPR-.0=SPR.0,LSTROW-=LSTROW,
    LSTROW_1-=LSTROW_1,SCNDROW-=SCNDROW,FRSTROW-=FRSTROW,
    SE-=SE,DUP-=DUP,P1_BUSY-=YINT_GT_1,INCY-=INCY,YINCEN-=YINCEN,
```

```
        ENYAU-=EENYAU,CLRYAU-=CLRYAU,XINT_GT_1-=XINT_GT_1,
        ENXAU-=ENXAU,CLRXAU-=CLRXAU,SEL00-=SEL00,SEL01-=SEL01,
        PDO2-.15=PD2.15,PDO2-.14=PD2.14,PDO2-.13=PD2.13,
        PDO2-.12=PD2.12,PDO2-.11=PD2.11,PDO2-.10=PD2.10,
        PDO2-.9=PD2.9,PDO2-.8=PD2.8,PDO2-.7=PD2.7,PDO2-.6=PD2.6,
        PDO2-.5=PD2.5,PDO2-.4=PD2.4,PDO2-.3=PD2.3,PDO2-.2=PD2.2,
        PDO2-.1=PD2.1,PDO2-.0=PD2.0,CNVL-.12=CNVL.12,CNVL-.11=CNVL.11,
        CNVL-.10=CNVL.10,CNVL-.9=CNVL.9,CNVL-.8=CNVL.8,
        CNVL-.7=CNVL.7,CNVL-.6=CNVL.6,CNVL-.5=CNVL.5,CNVL-.4=CNVL.4,
        CNVL-.3=CNVL.3,CNVL-.2=CNVL.2,CNVL-.1=CNVL.1,CNVL-.0=CNVL.0);
U0(CNVL-.12=CNVL.12,CNVL-.11=CNVL.11,CNVL-.10=CNVL.10,CNVL-.9=CNVL.9,
        CNVL-.8=CNVL.8,CNVL-.7=CNVL.7,CNVL-.6=CNVL.6,CNVL-.5=CNVL.5,
        CNVL-.4=CNVL.4,CNVL-.3=CNVL.3,CNVL-.2=CNVL.2,CNVL-.1=CNVL.1,
        CNVL-.0=CNVL.0,PDO2-.15=PDO2.15,PDO2-.14=PDO2.14,
        PDO2-.13=PDO2.13,PDO2-.12=PDO2.12,PDO2-.11=PDO2.11,
        PDO2-.10=PDO2.10,PDO2-.9=PDO2.9,PDO2-.8=PDO2.8,
        PDO2-.7=PDO2.7,PDO2-.6=PDO2.6,PDO2-.5=PDO2.5,PDO2-.4=PDO2.4,
        PDO2-.3=PDO2.3,PDO2-.2=PDO2.2,PDO2-.1=PDO2.1,PDO2-.0=PDO2.0)
        = ENGN_V3(S_MODE-=S_MODE,SEL10-=SEL10,SEL11-=SEL11,
        ROW_ORDER-.2=ROW_ORDR.2,ROW_ORDER-.1=ROW_ORDR.1,
        ROW_ORDER-.0=ROW_ORDR.0,NOS-.1=NOS.1,NOS-.0=NOS.0,
        BRESET_-=RESET_,U0.PDI-.12=PDI.12,U0.PDI-.11=PDI.11,
        U0.PDI-.10=PDI.10,U0.PDI-.9=PDI.9,U0.PDI-.8=PDI.8,
        U0.PDI-.7=PDI.7,U0.PDI-.6=PDI.6,U0.PDI-.5=PDI.5,
        U0.PDI-.4=PDI.4,U0.PDI-.3=PDI.3,U0.PDI-.2=PDI.2,
        U0.PDI-.1=PDI.1,U0.PDI-.0=PDI.0,CP-=CP,TST-=TST,
        U0.CD4-.11=CD4.11,U0.CD4-.10=CD4.10,U0.CD4-.9=CD4.9,
        U0.CD4-.8=CD4.8,U0.CD4-.7=CD4.7,U0.CD4-.6=CD4.6,
        U0.CD4-.5=CD4.5,U0.CD4-.4=CD4.4,U0.CD4-.3=CD4.3,
        U0.CD4-.2=CD4.2,U0.CD4-.1=CD4.1,U0.CD4-.0=CD4.0,
        U0.CD3-.11=CD3.11,U0.CD3-.10=CD3.10,U0.CD3-.9=CD3.9,
        U0.CD3-.8=CD3.8,U0.CD3-.7=CD3.7,U0.CD3-.6=CD3.6,
        U0.CD3-.5=CD3.5,U0.CD3-.4=CD3.4,U0.CD3-.3=CD3.3,
        U0.CD3-.2=CD3.2,U0.CD3-.1=CD3.1,U0.CD3-.0=CD3.0,
        U0.CD2-.11=CD2.11,U0.CD2-.10=CD2.10,U0.CD2-.9=CD2.9,
        U0.CD2-.8=CD2.8,U0.CD2-.7=CD2.7,U0.CD2-.6=CD2.6,
        U0.CD2-.5=CD2.5,U0.CD2-.4=CD2.4,U0.CD2-.3=CD2.3,
        U0.CD2-.2=CD2.2,U0.CD2-.1=CD2.1,U0.CD2-.0=CD2.0,
        U0.CD1-.11=CD1.11,U0.CD1-.10=CD1.10,U0.CD1-.9=CD1.9,
        U0.CD1-.8=CD1.8,U0.CD1-.7=CD1.7,U0.CD1-.6=CD1.6,
        U0.CD1-.5=CD1.5,U0.CD1-.4=CD1.4,U0.CD1-.3=CD1.3,
        U0.CD1-.2=CD1.2,U0.CD1-.1=CD1.1,U0.CD1-.0=CD1.0,
        U0.CD0-.11=CD0.11,U0.CD0-.10=CD0.10,U0.CD0-.9=CD0.9,
        U0.CD0-.8=CD0.8,U0.CD0-.7=CD0.7,U0.CD0-.6=CD0.6,
        U0.CD0-.5=CD0.5,U0.CD0-.4=CD0.4,U0.CD0-.3=CD0.3,
        U0.CD0-.2=CD0.2,U0.CD0-.1=CD0.1,U0.CD0-.0=CD0.0,
        DLY_POL-=DLY_POL,RC4-.7=RC4.7,RC4-.6=RC4.6,RC4-.5=RC4.5,
        RC4-.4=RC4.4,RC4-.3=RC4.3,RC4-.2=RC4.2,RC4-.1=RC4.1,
        RC4-.0=RC4.0,RC3-.7=RC3.7,RC3-.6=RC3.6,RC3-.5=RC3.5,
        RC3-.4=RC3.4,RC3-.3=RC3.3,RC3-.2=RC3.2,RC3-.1=RC3.1,
        RC3-.0=RC3.0,RC2-.7=RC2.7,RC2-.6=RC2.6,RC2-.5=RC2.5,
        RC2-.4=RC2.4,RC2-.3=RC2.3,RC2-.2=RC2.2,RC2-.1=RC2.1,
        RC2-.0=RC2.0,RC1-.7=RC1.7,RC1-.6=RC1.6,RC1-.5=RC1.5,
        RC1-.4=RC1.4,RC1-.3=RC1.3,RC1-.2=RC1.2,RC1-.1=RC1.1,
        RC1-.0=RC1.0,RC0-.7=RC0.7,RC0-.6=RC0.6,RC0-.5=RC0.5,
        RC0-.4=RC0.4,RC0-.3=RC0.3,RC0-.2=RC0.2,RC0-.1=RC0.1,
        RC0-.0=RC0.0,STB_I-=STB_I,DUP-=DUP,SE-=SE,BWAIT0-=WAIT,
        S-=S,FRSTROW-=FRST_ROW,SCNDROW-=SCND_ROW,LSTROW_1-=LST_ROW_1,
        LSTROW-=LST_ROW,SPR-.1=SPR.1,SPR-.0=SPR.0,PLR_CS_-=PLR_CS_,
        WR_-=WR_);
U10(MR-.4=Q.4,MR-.3=Q.3,MR-.2=Q.2,MR-.1=Q.1,MR-.0=Q.0) = MR5(
        U10.D-.4=D.4,U10.D-.3=D.3,U10.D-.2=D.2,U10.D-.1=D.1,
        U10.D-.0=D.0,MR_CS_-=CS_,WR_-=WR_,BRESET_-=RESET_);
U2(DLY_POL-=DLY_POL) = PSDV2FN(P1_BUSY-=P1_BUSY,CP-=CP,BRESET_-=RESET_,
        SCNDCOL-=SC,PSE-=SE,EOC-=EOC,S_MODE-=S_MODE);
U5(U5.COF_ADR-.2=COF_ADR.2,U5.COF_ADR-.1=COF_ADR.1,
        U5.COF_ADR-.0=COF_ADR.0,XINT_GT_1-=INT_GT_1,P1_BUSY-=P1_BUSY,
        CLRXCNT_-=CLRXCNT_) = XAUV2(PXL_EN-=PIX_EN,COF_ADRIN-.2=COF_ADRIN.2,
        COF_ADRIN-.1=COF_ADRIN.1,COF_ADRIN-.0=COF_ADRIN.0,
        INT_GT_1IN-=INT_GT_1IN,U5.S_MODE-=S_MODE,PDI-.15=PDI.15,
        PDI-.14=PDI.14,PDI-.13=PDI.13,PDI-.12=PDI.12,PDI-.11=PDI.11,
        PDI-.10=PDI.10,PDI-.9=PDI.9,PDI-.8=PDI.8,PDI-.7=PDI.7,
        PDI-.6=PDI.6,PDI-.5=PDI.5,PDI-.4=PDI.4,PDI-.3=PDI.3,
        PDI-.2=PDI.2,PDI-.1=PDI.1,PDI-.0=PDI.0,XAU_HCS_-=DH_CS_,
```

```
XAU_LCS_-=DL_CS_,WR_-=WR_,SPRCYC-=SPRCYC,ENXAU-=ENAU,
        CLRXAU-=CLRAU,CP-=CP,BWAIT0-=WAIT,XSCNIN-=SCNIN,TST-=TEST,
        BRESET_-=RESET_);
U3(U3.COF_ADR-.2=COF_ADR.2,U3.COF_ADR-.1=COF_ADR.1,
        U3.COF_ADR-.0=COF_ADR.0,ROW_ORDER-.2=ROW_ORDER.2,
        ROW_ORDER-.1=ROW_ORDER.1,ROW_ORDER-.0=ROW_ORDER.0,
        YINT-=YINT,EOR-=EOR,YINTSND-=YINTSND,INCY-=INCY,
        BMYL-.4=BMYL.4,BMYL-.3=BMYL.3,BMYL-.2=BMYL.2,BMYL-.1=BMYL.1,
        BMYL-.0=BMYL.0) = YAUV2(LIM-=LIM,LS_1-=LS_1,BRESET_-=RESET_,
        TST-=TEST,YSCNIN-=SCNIN,CP-=CP,CLRYAU-=CLRYAU,ENYAU-=ENYAU,
        YINCEN-=YINCEN,LSTROW-=LSTROW,LSTROW_1-=LSTROW_1,
        SCNDROW-=SCNDROW,FRSTROW-=FRSTROW,WR_-=WR_,YAU_LCS_-=DL_CS_,
        YAU_HCS_-=DH_CS_,PDI-.15=PDI.15,PDI-.14=PDI.14,
        PDI-.13=PDI.13,PDI-.12=PDI.12,PDI-.11=PDI.11,PDI-.10=PDI.10,
        PDI-.9=PDI.9,PDI-.8=PDI.8,PDI-.7=PDI.7,PDI-.6=PDI.6,
        PDI-.5=PDI.5,PDI-.4=PDI.4,PDI-.3=PDI.3,PDI-.2=PDI.2,
        PDI-.1=PDI.1,PDI-.0=PDI.0,U3.S_MODE-=S_MODE,U3.NOL-.2=NOL.2,
        U3.NOL-.1=NOL.1,U3.NOL-.0=NOL.0,YDWN-=YDWN,YUP-=YUP,
        U3.RND_EN-=RND_EN);


/* extractors ******************************/

  MR-.3 = (U1.S_MODE-);
  U4.DO-.23 = (U0.CD1-.11);
  U4.DO-.22 = (U0.CD1-.10);
  U4.DO-.21 = (U0.CD1-.9);
  U4.DO-.20 = (U0.CD1-.8);
  U4.DO-.19 = (U0.CD1-.7);
  U4.DO-.18 = (U0.CD1-.6);
  U4.DO-.17 = (U0.CD1-.5);
  U4.DO-.16 = (U0.CD1-.4);
  U4.DO-.15 = (U0.CD1-.3);
  U4.DO-.14 = (U0.CD1-.2);
  U4.DO-.13 = (U0.CD1-.1);
  U4.DO-.12 = (U0.CD1-.0);
  U4.DO-.47 = (U0.CD3-.11);
  U4.DO-.46 = (U0.CD3-.10);
  U4.DO-.45 = (U0.CD3-.9);
  U4.DO-.44 = (U0.CD3-.8);
  U4.DO-.43 = (U0.CD3-.7);
  U4.DO-.42 = (U0.CD3-.6);
  U4.DO-.41 = (U0.CD3-.5);
  U4.DO-.40 = (U0.CD3-.4);
  U4.DO-.39 = (U0.CD3-.3);
  U4.DO-.38 = (U0.CD3-.2);
  U4.DO-.37 = (U0.CD3-.1);
  U4.DO-.36 = (U0.CD3-.0);
  U4.DO-.11 = (U0.CD0-.11);
  U4.DO-.10 = (U0.CD0-.10);
  U4.DO-.9 = (U0.CD0-.9);
  U4.DO-.8 = (U0.CD0-.8);
  U4.DO-.7 = (U0.CD0-.7);
  U4.DO-.6 = (U0.CD0-.6);
  U4.DO-.5 = (U0.CD0-.5);
  U4.DO-.4 = (U0.CD0-.4);
  U4.DO-.3 = (U0.CD0-.3);
  U4.DO-.2 = (U0.CD0-.2);
  U4.DO-.1 = (U0.CD0-.1);
  U4.DO-.0 = (U0.CD0-.0);
  U4.DO-.35 = (U0.CD2-.11);
  U4.DO-.34 = (U0.CD2-.10);
  U4.DO-.33 = (U0.CD2-.9);
  U4.DO-.32 = (U0.CD2-.8);
  U4.DO-.31 = (U0.CD2-.7);
  U4.DO-.30 = (U0.CD2-.6);
  U4.DO-.29 = (U0.CD2-.5);
  U4.DO-.28 = (U0.CD2-.4);
  U4.DO-.27 = (U0.CD2-.3);
  U4.DO-.26 = (U0.CD2-.2);
  U4.DO-.25 = (U0.CD2-.1);
  U4.DO-.24 = (U0.CD2-.0);
  U4.DO-.59 = (U0.CD4-.11);
  U4.DO-.58 = (U0.CD4-.10);
```

```
    U4.DO-.57 = (U0.CD4-.9);
    U4.DO-.56 = (U0.CD4-.8);
    U4.DO-.55 = (U0.CD4-.7);
    U4.DO-.54 = (U0.CD4-.6);
    U4.DO-.53 = (U0.CD4-.5);
    U4.DO-.52 = (U0.CD4-.4);
    U4.DO-.51 = (U0.CD4-.3);
    U4.DO-.50 = (U0.CD4-.2);
    U4.DO-.49 = (U0.CD4-.1);
    U4.DO-.48 = (U0.CD4-.0);
    PDI-.12 = (U0.PDI-.12);
    PDI-.11 = (U0.PDI-.11);
    PDI-.10 = (U0.PDI-.10);
    PDI-.9 = (U0.PDI-.9);
    PDI-.8 = (U0.PDI-.8);
    PDI-.7 = (U0.PDI-.7);
    PDI-.6 = (U0.PDI-.6);
    PDI-.5 = (U0.PDI-.5);
    PDI-.4 = (U0.PDI-.4);
    PDI-.3 = (U0.PDI-.3);
    PDI-.2 = (U0.PDI-.2);
    PDI-.1 = (U0.PDI-.1);
    PDI-.0 = (U0.PDI-.0);
    PDI-.10 = (U10.D-.4);
    PDI-.9 = (U10.D-.3);
    PDI-.8 = (U10.D-.2);
    PDI-.7 = (U10.D-.1);
    PDI-.6 = (U10.D-.0);
    PDI-.11 = (U4.PDI-.11);
    PDI-.10 = (U4.PDI-.10);
    PDI-.9 = (U4.PDI-.9);
    PDI-.8 = (U4.PDI-.8);
    PDI-.7 = (U4.PDI-.7);
    PDI-.6 = (U4.PDI-.6);
    PDI-.5 = (U4.PDI-.5);
    PDI-.4 = (U4.PDI-.4);
    PDI-.3 = (U4.PDI-.3);
    PDI-.2 = (U4.PDI-.2);
    PDI-.1 = (U4.PDI-.1);
    PDI-.0 = (U4.PDI-.0);
    U8.Z-.0 = (BWAIT0-);
    U8.Z-.1 = (BWAIT1-);
    MR-.3 = (S_MODE-);
    MR-.3 = (U5.S_MODE-);
    MR-.3 = (U3.S_MODE-);
    MR-.2 = (U3.NOL-.2);
    MR-.1 = (U3.NOL-.1);
    MR-.0 = (U3.NOL-.0);
    MR-.4 = (U3.RND_EN-);


  /* type converters *********************/

ANNOTATIONS
{
  BUS BUS_TYPE = "DOT";
}

END MODULE;


/* * * * * * *  Contents of NET file SPTCOREV2.NET  * * * * * * */

/*******************************************************/
/*  Netlist copyright (C) 1989 LSI Logic Corporation   */
/*******************************************************/


MODULE SPTCOREV2;

INPUTS       ALE,CMEM_CS_,COF_ADRIN.2,COF_ADRIN.1,COF_ADRIN.0,CP,
             INT_GT_1IN,MR_CS_,PA.6,PA.5,PA.4,PA.3,PA.2,PA.1,PA.0,
             PDI.15,PDI.14,PDI.13,PDI.12,PDI.11,PDI.10,PDI.9,PDI.8,
```

```
            PDI.7,PDI.6,PDI.5,PDI.4,PDI.3,PDI.2,PDI.1,PDI.0,
            PLR_CS_,PXL_EN,RC0.7,RC0.6,RC0.5,RC0.4,RC0.3,RC0.2,
            RC0.1,RC0.0,RC1.7,RC1.6,RC1.5,RC1.4,RC1.3,RC1.2,RC1.1,
            RC1.0,RC2.7,RC2.6,RC2.5,RC2.4,RC2.3,RC2.2,RC2.1,RC2.0,
            RC3.7,RC3.6,RC3.5,RC3.4,RC3.3,RC3.2,RC3.1,RC3.0,RC4.7,
            RC4.6,RC4.5,RC4.4,RC4.3,RC4.2,RC4.1,RC4.0,RDY_I,
            RESET_,SEL00,SEL01,SEL10,SEL11,STOP,STRT,TST,WAIT,WR_,
            XAU_HCS_,XAU_LCS_,XDIM_CS_,XSCNIN,YAU_HCS_,YAU_LCS_,
            YDIM_CS_,YDWN,YSCNIN,YUP;
OUTPUTS     BMYL.4,BMYL.3,BMYL.2,BMYL.1,BMYL.0,CLRXCNT_,CNVL.12,
            CNVL.11,CNVL.10,CNVL.9,CNVL.8,CNVL.7,CNVL.6,CNVL.5,
            CNVL.4,CNVL.3,CNVL.2,CNVL.1,CNVL.0,PDO.15,PDO.14,
            PDO.13,PDO.12,PDO.11,PDO.10,PDO.9,PDO.8,PDO.7,PDO.6,
            PDO.5,PDO.4,PDO.3,PDO.2,PDO.1,PDO.0,REQ_I,REQ_O,STB_I,
            YINT,YINTSND;

LEVEL FUNCTION;
DEFINE
  /* implicit connectors ********************/

    PA-.6 = (PA.6);
    PA-.5 = (PA.5);
    PA-.4 = (PA.4);
    PA-.3 = (PA.3);
    PA-.2 = (PA.2);
    PA-.1 = (PA.1);
    PA-.0 = (PA.0);
    ALE- = (ALE);
    XAU_HCS_- = (XAU_HCS_);
    XAU_LCS_- = (XAU_LCS_);
    YAU_HCS_- = (YAU_HCS_);
    YAU_LCS_- = (YAU_LCS_);
    CMEM_CS_- = (CMEM_CS_);
    PLR_CS_- = (PLR_CS_);
    SEL00- = (SEL00);
    SEL01- = (SEL01);
    SEL10- = (SEL10);
    SEL11- = (SEL11);
    TST- = (TST);
    XSCNIN- = (XSCNIN);
    YSCNIN- = (YSCNIN);
    RC0-.7 = (RC0.7);
    RC0-.6 = (RC0.6);
    RC0-.5 = (RC0.5);
    RC0-.4 = (RC0.4);
    RC0-.3 = (RC0.3);
    RC0-.2 = (RC0.2);
    RC0-.1 = (RC0.1);
    RC0-.0 = (RC0.0);
    RC1-.7 = (RC1.7);
    RC1-.6 = (RC1.6);
    RC1-.5 = (RC1.5);
    RC1-.4 = (RC1.4);
    RC1-.3 = (RC1.3);
    RC1-.2 = (RC1.2);
    RC1-.1 = (RC1.1);
    RC1-.0 = (RC1.0);
    RC2-.7 = (RC2.7);
    RC2-.6 = (RC2.6);
    RC2-.5 = (RC2.5);
    RC2-.4 = (RC2.4);
    RC2-.3 = (RC2.3);
    RC2-.2 = (RC2.2);
    RC2-.1 = (RC2.1);
    RC2-.0 = (RC2.0);
    RC4-.7 = (RC4.7);
    RC4-.6 = (RC4.6);
    RC4-.5 = (RC4.5);
    RC4-.4 = (RC4.4);
    RC4-.3 = (RC4.3);
    RC4-.2 = (RC4.2);
    RC4-.1 = (RC4.1);
    RC4-.0 = (RC4.0);
```

```
COF_ADRIN-.2 = (COF_ADRIN.2);
COF_ADRIN-.1 = (COF_ADRIN.1);
COF_ADRIN-.0 = (COF_ADRIN.0);
BMYL-.4 = (BMYL.4);
BMYL-.3 = (BMYL.3);
BMYL-.2 = (BMYL.2);
BMYL-.1 = (BMYL.1);
BMYL-.0 = (BMYL.0);
CLRXCNT_- = (CLRXCNT_);
PDO-.15 = (PDO.15);
PDO-.14 = (PDO.14);
PDO-.13 = (PDO.13);
PDO-.12 = (PDO.12);
PDO-.11 = (PDO.11);
PDO-.10 = (PDO.10);
PDO-.9 = (PDO.9);
PDO-.8 = (PDO.8);
PDO-.7 = (PDO.7);
PDO-.6 = (PDO.6);
PDO-.5 = (PDO.5);
PDO-.4 = (PDO.4);
PDO-.3 = (PDO.3);
PDO-.2 = (PDO.2);
PDO-.1 = (PDO.1);
PDO-.0 = (PDO.0);
YINT- = (YINT);
YINTSND- = (YINTSND);
INT_GT_1IN- = (INT_GT_1IN);
INT_GT_1IN- = (INT_GT_1IN);
NOS-.1 = (NOS.1);
NOS-.0 = (NOS.0);
NOS-.1 = (NOS.1);
NOS-.0 = (NOS.0);
CP- = (CP);
CP- = (CP);
S_MODE- = (S_MODE);
S_MODE- = (S_MODE);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
PDI-.15 = (PDI.15);
PDI-.14 = (PDI.14);
PDI-.13 = (PDI.13);
PDI-.12 = (PDI.12);
PDI-.11 = (PDI.11);
PDI-.10 = (PDI.10);
PDI-.9 = (PDI.9);
PDI-.8 = (PDI.8);
PDI-.7 = (PDI.7);
PDI-.6 = (PDI.6);
PDI-.5 = (PDI.5);
PDI-.4 = (PDI.4);
PDI-.3 = (PDI.3);
PDI-.2 = (PDI.2);
PDI-.1 = (PDI.1);
PDI-.0 = (PDI.0);
WR_- = (WR_);
WR_- = (WR_);
XDIM_CS_- = (XDIM_CS_);
YDIM_CS_- = (YDIM_CS_);
MR_CS_- = (MR_CS_);
```

```
MR_CS_- = (MR_CS_);
RESET_- = (RESET_);
BRESET_- = (BRESET_);
BRESET_- = (BRESET_);
BRESET_- = (BRESET_);
REQ_O- = (REQ_O);
STB_I- = (STB_I);
STB_I- = (STB_I);
EOR- = (EOR);
EOR- = (EOR);
STOP- = (STOP);
STRT- = (STRT);
YDWN- = (YDWN);
YDWN- = (YDWN);
YUP- = (YUP);
YUP- = (YUP);
REQ_I- = (REQ_I);
REQ_I- = (REQ_I);
RDY_I- = (RDY_I);
RDY_I- = (RDY_I);
BWAIT- = (BWAIT);
BWAIT- = (BWAIT);
BWAIT- = (BWAIT);
WAIT- = (WAIT);
HLT- = (HLT);
HLT- = (HLT);
PXL_EN- = (PXL_EN);
PXL_EN- = (PXL_EN);
CNVL-.12 = (CNVL.12);
CNVL-.11 = (CNVL.11);
CNVL-.10 = (CNVL.10);
CNVL-.9 = (CNVL.9);
CNVL-.8 = (CNVL.8);
CNVL-.7 = (CNVL.7);
CNVL-.6 = (CNVL.6);
CNVL-.5 = (CNVL.5);
CNVL-.4 = (CNVL.4);
CNVL-.3 = (CNVL.3);
CNVL-.2 = (CNVL.2);
CNVL-.1 = (CNVL.1);
CNVL-.0 = (CNVL.0);
RC3-.7 = (RC3.7);
RC3-.6 = (RC3.6);
RC3-.5 = (RC3.5);
RC3-.4 = (RC3.4);
RC3-.3 = (RC3.3);
RC3-.2 = (RC3.2);
RC3-.1 = (RC3.1);
RC3-.0 = (RC3.0);


/* part instances **************************/

U6(BRESET_-=Z) = B3A(RESET_-=A);
U2(U2.Z-=Z) = N1B(REQ_I-=A);
U4(BWAIT-=Z) = OR2C(U5.Z-=A,WAIT-=B);
U5(U5.Z-=Z) = AO3C(U2.Z-=A,RDY_I-=B,U3.Z-=C,U3.Z-=D);
U3(U3.Z-=Z) = N1B(HLT-=A);
U1(NOS-.1=NOS.1,NOS-.0=NOS.0,U1.CLRXAU-=CLRXAU,U1.SPR-.1=SPR.1,
        U1.SPR-.0=SPR.0,U1.EOC-=EOC,U1.CMAGEN-=CMAGEN,
        U1.SPRCYC-=SPRCYC,U1.LIM-=LIM,U1.LS_1-=LS_1,U1.PSE-=PSE,
        U1.YADRSEL-=YADRSEL,U1.S-=S,U1.YINCEN-=YINCEN,
        U1.SCNDCOL-=SCNDCOL,U1.FRSTROW-=FRSTROW,U1.SCNDROW-=SCNDROW,
        U1.LSTROW_1-=LSTROW_1,U1.LSTROW-=LSTROW,U1.DUP-=DUP,
        U1.SE-=SE,U1.ENXAU-=ENXAU,U1.ENYAU-=ENYAU,U1.CLRYAU-=CLRYAU,
        REQ_O-=REQ_O,STB_I-=STB,REQ_I-=REQ,HLT-=HLT) =
        CNVCNTV4(INT_GT_1IN-=INT_GT_1IN,PXL_EN-=PXL_EN,
        U0.DLY_POL-=DLY_POL,U0.XINT_GT_1-=INCX,U0.INCY-=INCY,
        CP-=CP,S_MODE-=S_MODE,PDI-.15=PDI.15,PDI-.14=PDI.14,
        PDI-.13=PDI.13,PDI-.12=PDI.12,PDI-.11=PDI.11,PDI-.10=PDI.10,
        PDI-.9=PDI.9,PDI-.8=PDI.8,PDI-.7=PDI.7,PDI-.6=PDI.6,
        PDI-.5=PDI.5,PDI-.4=PDI.4,PDI-.3=PDI.3,PDI-.2=PDI.2,
        PDI-.1=PDI.1,PDI-.0=PDI.0,WR_-=WR_,XDIM_CS_-=XDIM_CS_,
        YDIM_CS_-=YDIM_CS_,MR_CS_-=MR_CS_,BRESET_-=RESET_,
```

```
          EOR-=EOR,BWAIT-=WAIT,RDY_I-=RDY,STOP-=STOP,STRT-=STRT,
          YDWN-=YDWN,YUP-=YUP);
  U0(U0.DLY_POL-=DLY_POL,U0.XINT_GT_1-=XINT_GT_1,U0.INCY-=INCY,
          S_MODE-=S_MODE,EOR-=EOR,BMYL-.4=BMYL.4,BMYL-.3=BMYL.3,
          BMYL-.2=BMYL.2,BMYL-.1=BMYL.1,BMYL-.0=BMYL.0,
          CLRXCNT_-=CLRXCNT_,PDO-.15=PDO.15,PDO-.14=PDO.14,
          PDO-.13=PDO.13,PDO-.12=PDO.12,PDO-.11=PDO.11,PDO-.10=PDO.10,
          PDO-.9=PDO.9,PDO-.8=PDO.8,PDO-.7=PDO.7,PDO-.6=PDO.6,
          PDO-.5=PDO.5,PDO-.4=PDO.4,PDO-.3=PDO.3,PDO-.2=PDO.2,
          PDO-.1=PDO.1,PDO-.0=PDO.0,YINT-=YINT,YINTSND-=YINTSND,
          CNVL-.12=CNVL.12,CNVL-.11=CNVL.11,CNVL-.10=CNVL.10,
          CNVL-.9=CNVL.9,CNVL-.8=CNVL.8,CNVL-.7=CNVL.7,CNVL-.6=CNVL.6,
          CNVL-.5=CNVL.5,CNVL-.4=CNVL.4,CNVL-.3=CNVL.3,CNVL-.2=CNVL.2,
          CNVL-.1=CNVL.1,CNVL-.0=CNVL.0) = CNV_V4(NOS-.1=NOS.1,
          NOS-.0=NOS.0,U1.CLRXAU-=CLRXAU,U1.SPR-.1=SPR.1,
          U1.SPR-.0=SPR.0,U1.EOC-=EOC,U1.CMAGEN-=CMAGEN,
          U1.SPRCYC-=SPRCYC,U1.LIM-=LIM,U1.LS_1-=LS_1,U1.PSE-=PSE,
          U1.YADRSEL-=YADRSEL,U1.S-=S,U1.YINCEN-=YINCEN,
          U1.SCNDCOL-=SCNDCOL,U1.FRSTROW-=FRSTROW,U1.SCNDROW-=SCNDROW,
          U1.LSTROW_1-=LSTROW_1,U1.LSTROW-=LSTROW,U1.DUP-=DUP,
          U1.SE-=SE,U1.ENXAU-=ENXAU,U1.ENYAU-=ENYAU,U1.CLRYAU-=CLRYAU,
          PA-.6=PA.6,PA-.5=PA.5,PA-.4=PA.4,PA-.3=PA.3,PA-.2=PA.2,
          PA-.1=PA.1,PA-.0=PA.0,ALE-=ALE,XAU_HCS_-=XAU_HCS_,
          XAU_LCS_-=XAU_LCS_,YAU_HCS_-=YAU_HCS_,YAU_LCS_-=YAU_LCS_,
          CMEM_CS_-=CMEM_CS_,PLR_CS_-=PLR_CS_,MR_CS_-=MR_CS_,
          SEL00-=SEL00,SEL01-=SEL01,SEL10-=SEL10,SEL11-=SEL11,
          TST-=TST,XSCNIN-=XSCNIN,YSCNIN-=YSCNIN,CP-=CP,RC0-.7=RC0.7,
          RC0-.6=RC0.6,RC0-.5=RC0.5,RC0-.4=RC0.4,RC0-.3=RC0.3,
          RC0-.2=RC0.2,RC0-.1=RC0.1,RC0-.0=RC0.0,RC1-.7=RC1.7,
          RC1-.6=RC1.6,RC1-.5=RC1.5,RC1-.4=RC1.4,RC1-.3=RC1.3,
          RC1-.2=RC1.2,RC1-.1=RC1.1,RC1-.0=RC1.0,RC2-.7=RC2.7,
          RC2-.6=RC2.6,RC2-.5=RC2.5,RC2-.4=RC2.4,RC2-.3=RC2.3,
          RC2-.2=RC2.2,RC2-.1=RC2.1,RC2-.0=RC2.0,RC3-.7=RC3.7,
          RC3-.6=RC3.6,RC3-.5=RC3.5,RC3-.4=RC3.4,RC3-.3=RC3.3,
          RC3-.2=RC3.2,RC3-.1=RC3.1,RC3-.0=RC3.0,RC4-.7=RC4.7,
          RC4-.6=RC4.6,RC4-.5=RC4.5,RC4-.4=RC4.4,RC4-.3=RC4.3,
          RC4-.2=RC4.2,RC4-.1=RC4.1,RC4-.0=RC4.0,INT_GT_1IN-=INT_GT_1IN,
          COF_ADRIN-.2=COF_ADRIN.2,COF_ADRIN-.1=COF_ADRIN.1,
          COF_ADRIN-.0=COF_ADRIN.0,YUP-=YUP,YDWN-=YDWN,PDI-.15=PDI.15,
          PDI-.14=PDI.14,PDI-.13=PDI.13,PDI-.12=PDI.12,PDI-.11=PDI.11,
          PDI-.10=PDI.10,PDI-.9=PDI.9,PDI-.8=PDI.8,PDI-.7=PDI.7,
          PDI-.6=PDI.6,PDI-.5=PDI.5,PDI-.4=PDI.4,PDI-.3=PDI.3,
          PDI-.2=PDI.2,PDI-.1=PDI.1,PDI-.0=PDI.0,WR_-=WR_,
          STB_I-=STB_I,BRESET_-=RESET_,BWAIT-=WAIT,PXL_EN-=PXL_EN);

  /* extractors ******************************/


  /* type converters *********************/

ANNOTATIONS
{
  BUS BUS_TYPE = "DOT";
}

END MODULE;


/* * * * * * *  Contents of NET file HBIV1.NET  * * * * * * */

/******************************************************/
/*  Netlist copyright (C) 1989 LSI Logic Corporation  */
/******************************************************/


MODULE HBIV1;

INPUTS      ALE,CS_,MPA.7,MPA.6,MPA.5,MPA.4,MPA.3,MPA.2,MPA.1,
            MPA.0,RD_,RESET_;
OUTPUTS     CMEM_CS_,MPD_OE_,MR_CS_,PA.6,PA.5,PA.4,PA.3,PA.2,PA.1,
            PA.0,PLR_CS_,SEL00,SEL01,SEL10,SEL11,XAU_HCS_,
            XAU_LCS_,XDIM_CS_,YAU_HCS_,YAU_LCS_,YDIM_CS_;
```

```
LEVEL FUNCTION;
DEFINE
  /* implicit connectors *******************/

    YDIM_CS_- = (YDIM_CS_);
    YAU_LCS_- = (YAU_LCS_);
    YAU_HCS_- = (YAU_HCS_);
    XDIM_CS_- = (XDIM_CS_);
    XAU_LCS_- = (XAU_LCS_);
    MR_CS_- = (MR_CS_);
    CMEM_CS_- = (CMEM_CS_);
    MPD_OE_- = (MPD_OE_);
    MPA-.7 = (MPA.7);
    MPA-.6 = (MPA.6);
    MPA-.5 = (MPA.5);
    MPA-.4 = (MPA.4);
    MPA-.3 = (MPA.3);
    MPA-.2 = (MPA.2);
    MPA-.1 = (MPA.1);
    MPA-.0 = (MPA.0);
    RESET_- = (RESET_);
    BRESET_- = (BRESET_);
    BRESET_- = (BRESET_);
    ALE- = (ALE);
    PA-.6 = (PA.6);
    PA-.5 = (PA.5);
    PA-.4 = (PA.4);
    PA-.3 = (PA.3);
    PA-.2 = (PA.2);
    PA-.1 = (PA.1);
    PA-.0 = (PA.0);
    RD_- = (RD_);
    CS_- = (CS_);
    PLR_CS_- = (PLR_CS_);
    SEL00- = (SEL00);
    SEL01- = (SEL01);
    SEL10- = (SEL10);
    SEL11- = (SEL11);
    XAU_HCS_- = (XAU_HCS_);

 /* part instances **************************/

   U3(MPD_OE_-=Z) = B2A(U0.MPD_OE-=A);
   U1(BRESET_-=Z) = B3A(RESET_-=A);
   U2.7(U2.Q-.7=Q) = LD3A(MPA-.7=D,BRESET_-=CD,ALE-=G);
   U2.6(U2.Q-.6=Q) = LD3A(MPA-.6=D,BRESET_-=CD,ALE-=G);
   U2.5(U2.Q-.5=Q) = LD3A(MPA-.5=D,BRESET_-=CD,ALE-=G);
   U2.4(U2.Q-.4=Q) = LD3A(MPA-.4=D,BRESET_-=CD,ALE-=G);
   U2.3(U2.Q-.3=Q) = LD3A(MPA-.3=D,BRESET_-=CD,ALE-=G);
   U2.2(U2.Q-.2=Q) = LD3A(MPA-.2=D,BRESET_-=CD,ALE-=G);
   U2.1(U2.Q-.1=Q) = LD3A(MPA-.1=D,BRESET_-=CD,ALE-=G);
   U2.0(U2.Q-.0=Q) = LD3A(MPA-.0=D,BRESET_-=CD,ALE-=G);
   U0(YDIM_CS_-=YDIM_CS_,YAU_LCS_-=YAU_LCS_,YAU_HCS_-=YAU_HCS_,
          XDIM_CS_-=XDIM_CS_,XAU_LCS_-=XAU_LCS_,XAU_HCS_-=XAU_HCS_,
          MR_CS_-=MR_CS_,CMEM_CS_-=CMEM_CS_,U0.MPD_OE-=MPD_OE,
          PLR_CS_-=PLR_CS_,SEL00-=SEL00,SEL01-=SEL01,SEL10-=SEL10,
          SEL11-=SEL11) = PADECV1(U0.MPA7-=MPA7,U0.MPA0-=MPA0,
          U0.MPA1-=MPA1,U0.MPA2-=MPA2,U0.MPA3-=MPA3,U0.MPA4-=MPA4,
          U0.MPA5-=MPA5,U0.MPA6-=MPA6,RD_-=RD_,CS_-=CS_);

 /* extractors *****************************/

   U2.Q-.2 = (U0.MPA2-);
   U2.Q-.1 = (U0.MPA1-);
   U2.Q-.5 = (U0.MPA5-);
   U2.Q-.4 = (U0.MPA4-);
   U2.Q-.0 = (U0.MPA0-);
   U2.Q-.6 = (PA-.6);
   U2.Q-.5 = (PA-.5);
   U2.Q-.4 = (PA-.4);
   U2.Q-.3 = (PA-.3);
   U2.Q-.2 = (PA-.2);
```

```
    U2.Q-.1 = (PA-.1);
    U2.Q-.0 = (PA-.0);
    U2.Q-.3 = (U0.MPA3-);
    U2.Q-.7 = (U0.MPA7-);
    U2.Q-.6 = (U0.MPA6-);


  /* type converters ********************/

ANNOTATIONS
{
  BUS BUS_TYPE = "DOT";
}

END MODULE;


/* * * * * * *  Contents of NET file YAUCNTV4.NET  * * * * * * */

/* Generated by SYN Version 0.96 */


MODULE YAUCNTV4;
INPUTS
      CP, YINT, YINT_1, ENYAU,
      YINCEN, CLRYAU, FR, SR,
      LR_1, LR, LIM, LS_1;
OUTPUTS
      DCR, HLD, YINTSND, CE,
      EOR, RST, CLRCNT, INCY,
      RLD, CLD;
DEFINE
    CLD = (W-56);
    RLD = (W-55);
    INCY = (W-54);
    CLRCNT = (W-53);
    RST = (W-52);
    EOR = (W-51);
    CE = (W-50);
    YINTSND = (W-49);
    HLD = (W-48);
    DCR = (W-47);
    CORE(W-44, W-45, W-46, W-47,
      W-48, W-49, W-50, W-51,
      W-52, W-53, W-54, W-55,
      W-56)
    = YAUCNTV4CR(YINT, YINT_1, ENYAU, YINCEN,
      CLRYAU, FR, SR, LR_1,
      LR, LIM, LS_1, W-88,
      W-86, W-84);
    M-1(W-84, W-85)
    = FD1A(W-44, CP);
    M-2(W-86, W-87)
    = FD1A(W-45, CP);
    M-3(W-88, W-89)
    = FD1A(W-46, CP);
END MODULE;

MODULE YAUCNTV4CR;
INPUTS
    YINT, YINT_1, ENYAU, YINCEN,
    CLRYAU, FR, SR, LR_1,
    LR, LIM, LS_1, STBIT0I,
    STBIT1I, STBIT2I;
OUTPUTS
    STBIT2O, STBIT1O, STBIT0O, DCR,
    HLD, YINTSND, CE, EOR,
    RST, CLRCNT, INCY, RLD,
    CLD;
DEFINE
    W148 = (YINT);
    W142 = (YINT_1);
    W140 = (ENYAU);
```

```
W135 = (YINCEN);
W133 = (CLRYAU);
W129 = (FR);
W128 = (SR);
W122 = (LR_1);
W121 = (LR);
W119 = (LIM);
W117 = (LS_1);
W112 = (STBIT0I);
W107 = (STBIT1I);
W106 = (STBIT2I);
STBIT2O = (W104);
STBIT1O = (W103);
STBIT0O = (W99);
DCR = (W97);
HLD = (W95);
YINTSND = (W92);
CE = (W91);
EOR = (W87);
RST = (W85);
CLRCNT = (W79);
INCY = (W76);
RLD = (W73);
CLD = (W69);
M4(W67) =
  N1B(W135);
M3(W65) =
  AND2B(W67, W119);
M2(W64) =
  N1D(W112);
M1(W59) =
  AND2B(W117, W64);
M7(W57) =
  N1D(W107);
M8(W56) =
  ND3B(W65, W59, W57);
M9(W54) =
  N1C(W106);
M10(W53) =
  ND3B(W133, W172, W54);
M11(W52) =
  ND3B(W133, W172, W57);
M12(W49) =
  N1D(W133);
M13(W169) =
  AND3C(W148, W173, W49);
M14(W168) =
  N1C(W129);
M15(W167) =
  N1C(W128);
M16(W166) =
  N1C(W122);
M17(W165) =
  AND3B(W168, W167, W166);
M18(W164) =
  N1C(W121);
M19(W163) =
  ND2B(W164, W64);
M20(W162) =
  ND2B(W171, W170);
M21(W161) =
  NR2B(W163, W162);
M22(W160) =
  ND3B(W169, W165, W161);
M23(W159) =
  ND2B(W148, W173);
M24(W158) =
  ND2B(W49, W168);
M25(W157) =
  NR2B(W159, W158);
M26(W156) =
  ND2B(W167, W166);
M27(W155) =
  N1C(W119);
```

```
M28(W154) =
  ND2B(W121, W155);
M29(W153) =
  NR2B(W156, W154);
M30(W152) =
  AND3C(W64, W171, W170);
M31(W151) =
  ND3C(W157, W153, W152);
M32(W150) =
  AND2B(W148, W173);
M33(W149) =
  AND2B(W49, W119);
M35(W147) =
  ND3C(W150, W149, W152);
M36(W146) =
  N1C(W140);
M37(W145) =
  AND2C(W146, W49);
M38(W144) =
  AND2B(W64, W171);
M39(W143) =
  ND3B(W145, W144, W170);
M41(W141) =
  AND3B(W168, W167, W164);
M43(W139) =
  ND3B(W169, W141, W152);
M44(W138) =
  AND2B(W173, W49);
M45(W137) =
  AND2B(W172, W57);
M46(W136) =
  ND3B(W138, W137, W170);
M48(W134) =
  AND3B(W167, W166, W164);
M50(W132) =
  ND3B(W169, W134, W152);
M51(W131) =
  N1B(W148);
M52(W130) =
  AND2B(W131, W173);
M55(W127) =
  ND3B(W130, W149, W152);
M56(W126) =
  AND2B(W142, W173);
M57(W125) =
  AND2C(W49, W172);
M58(W124) =
  AND2B(W171, W54);
M59(W123) =
  ND3C(W126, W125, W124);
M62(W120) =
  ND3C(W145, W137, W170);
M64(W118) =
  AND3B(W168, W166, W164);
M66(W116) =
  ND3B(W169, W118, W152);
M67(W115) =
  ND4B(W135, W155, W64, W57);
M68(W114) =
  N1B(W142);
M69(W113) =
  AND2B(W114, W173);
M71(W111) =
  AND2C(W57, W54);
M72(W110) =
  ND3B(W113, W125, W111);
M73(W109) =
  ND4B(W133, W64, W171, W170);
M74(W108) =
  ND3B(W131, W64, W171);
M77(W105) =
  ND3C(W138, W144, W54);
M80(W102) =
  ND3B(W145, W137, W54);
```

```
M81(W101) =
  AND3C(W148, W142, W173);
M82(W100) =
  AND3B(W49, W119, W172);
M84(W98) =
  ND3B(W101, W100, W111);
M86(W96) =
  AND3B(W49, W166, W172);
M88(W94) =
  ND3B(W101, W96, W111);
M89(W93) =
  ND4B(W67, W64, W57, W170);
M92(W90) =
  AND3B(W172, W57, W54);
M93(W89) =
  ND3B(W113, W149, W90);
M94(W88) =
  ND4B(W135, W64, W57, W170);
M96(W86) =
  AND3B(W49, W129, W155);
M98(W84) =
  ND3B(W101, W86, W144);
M99(W83) =
  AND2B(W148, W142);
M100(W82) =
  AND2B(W49, W122);
M101(W81) =
  AND3B(W155, W64, W171);
M102(W80) =
  ND3B(W83, W82, W81);
M104(W78) =
  AND3B(W49, W168, W167);
M105(W77) =
  ND2B(W166, W64);
M107(W75) =
  NR2B(W77, W162);
M108(W74) =
  ND3B(W101, W78, W75);
M110(W72) =
  AND3B(W49, W164, W64);
M111(W71) =
  AND2B(W171, W170);
M112(W70) =
  ND3B(W101, W72, W71);
M114(W68) =
  AND3B(W49, W122, W155);
M116(W66) =
  ND3C(W101, W68, W90);
M119(W63) =
  ND3B(W83, W125, W57);
M120(W62) =
  AND2B(W135, W119);
M121(W61) =
  N1B(W117);
M122(W60) =
  AND2B(W61, W64);
M124(W58) =
  ND3B(W62, W60, W111);
M127(W55) =
  ND3B(W62, W59, W57);
M131(W51) =
  ND3B(W113, W125, W124);
M132(W50) =
  ND4B(W142, W49, W172, W57);
M134(W48) =
  AND2B(W172, W171);
M135(W47) =
  ND3B(W145, W48, W54);
M136(W46) =
  ND4B(W146, W49, W64, W171);
M137(W45) =
  ND3B(W64, W171, W54);
M138(W44) =
  ND3B(W67, W64, W57);
```

```
M139(W43) =
  AND2B(W56, W143);
M140(W42) =
  AND2B(W120, W105);
M141(W41) =
  AND2B(W93, W84);
M142(W104) =
  ND3B(W43, W42, W41);
M143(W40) =
  AND3B(W115, W105, W88);
M144(W39) =
  AND3B(W80, W66, W55);
M145(W38) =
  AND2B(W47, W46);
M146(W103) =
  ND3B(W40, W39, W38);
M147(W37) =
  AND2B(W160, W147);
M148(W36) =
  AND2B(W120, W102);
M149(W35) =
  AND3B(W70, W50, W47);
M150(W99) =
  ND3B(W37, W36, W35);
M151(W34) =
  AND3B(W147, W139, W136);
M152(W33) =
  AND3B(W132, W120, W116);
M153(W32) =
  ND2B(W105, W63);
M154(W31) =
  ND2B(W51, W46);
M155(W30) =
  NR2B(W32, W31);
M156(W97) =
  ND3B(W34, W33, W30);
M157(W29) =
  ND3B(W53, W52, W151);
M158(W28) =
  ND2B(W123, W120);
M159(W27) =
  NR2B(W29, W28);
M160(W26) =
  ND3B(W110, W109, W108);
M161(W25) =
  ND2B(W102, W58);
M162(W24) =
  NR2B(W26, W25);
M163(W23) =
  ND2B(W47, W46);
M164(W22) =
  ND2B(W45, W44);
M165(W21) =
  NR2B(W23, W22);
M166(W95) =
  ND3B(W27, W24, W21);
M167(W20) =
  ND2B(W151, W147);
M168(W19) =
  ND2B(W139, W136);
M169(W18) =
  NR2B(W20, W19);
M170(W17) =
  ND2B(W132, W116);
M171(W16) =
  ND2B(W105, W102);
M172(W15) =
  NR2B(W17, W16);
M173(W14) =
  AND3B(W98, W94, W66);
M174(W92) =
  ND3B(W18, W15, W14);
M175(W91) =
  ND4B(W160, W147, W98, W94);
```

```
    M176(W87) =
      ND2B(W151, W123);
    M177(W13) =
      AND2B(W53, W52);
    M178(W12) =
      AND2B(W151, W123);
    M179(W85) =
      ND3B(W13, W12, W109);
    M180(W79) =
      ND3B(W53, W52, W109);
    M181(W11) =
      ND2B(W147, W139);
    M182(W10) =
      ND2B(W136, W132);
    M183(W9) =
      NR2B(W11, W10);
    M184(W8) =
      ND2B(W123, W116);
    M185(W7) =
      ND2B(W98, W94);
    M186(W6) =
      NR2B(W8, W7);
    M187(W5) =
      AND3B(W74, W66, W51);
    M188(W76) =
      ND3B(W9, W6, W5);
    M189(W73) =
      ND3B(W127, W110, W66);
    M190(W4) =
      AND2B(W127, W89);
    M191(W3) =
      AND2B(W88, W58);
    M192(W69) =
      ND3B(W4, W3, W55);
    M133(W170) =
      N1C(W54);
    M130(W171) =
      N1C(W57);
    M129(W172) =
      N1C(W64);
    M128(W173) =
      N1C(W146);
END MODULE;


/* * * * * * *  Contents of NET file XSEQV5.NET  * * * * * * */

/* Generated by SYN Version 0.96 */


MODULE XSEQV5;
INPUTS
      CP, STRT_FLG, CO, INC,
      WAIT, RDY, DLY_POL, SPRCYC;
OUTPUTS
      LD_, CI, FC, SC,
      LC_1, LC, REQ, DUP,
      ENXAU, SE, CLRXAU, EOC,
      STBEN, CNVEN, YADRSEL, YINCEN,
      ENSPR, CLRSPR;
DEFINE
    CLRSPR = (W-74);
    ENSPR = (W-73);
    YINCEN = (W-72);
    YADRSEL = (W-71);
    CNVEN = (W-70);
    STBEN = (W-69);
    EOC = (W-68);
    CLRXAU = (W-67);
    SE = (W-66);
    ENXAU = (W-65);
   _DUP = (W-64);
```

```
    REQ = (W-63);
    LC = (W-62);
    LC_1 = (W-61);
    SC = (W-60);
    FC = (W-59);
    CI = (W-58);
    LD_ = (W-57);
    CORE(W-52, W-53, W-54, W-55,
      W-56, W-57, W-58, W-59,
      W-60, W-61, W-62, W-63,
      W-64, W-65, W-66, W-67,
      W-68, W-69, W-70, W-71,
      W-72, W-73, W-74)
    = XSEQV5CR(STRT_FLG, CO, INC, WAIT,
      RDY, DLY_POL, SPRCYC, W-118,
      W-116, W-114, W-112, W-110);
    M-1(W-110, W-111)
    = FD1A(W-52, CP);
    M-2(W-112, W-113)
    = FD1A(W-53, CP);
    M-3(W-114, W-115)
    = FD1A(W-54, CP);
    M-4(W-116, W-117)
    = FD1A(W-55, CP);
    M-5(W-118, W-119)
    = FD1A(W-56, CP);
END MODULE;

MODULE XSEQV5CR;
INPUTS
    STRT_FLG, CO, INC, WAIT,
    RDY, DLY_POL, SPRCYC, STBIT0I,
    STBIT1I, STBIT2I, STBIT3I, STBIT4I;
OUTPUTS
    STBIT4O, STBIT3O, STBIT2O, STBIT1O,
    STBIT0O, LD_, CI, FC,
    SC, LC_1, LC, REQ,
    DUP, ENXAU, SE, CLRXAU,
    EOC, STBEN, CNVEN, YADRSEL,
    YINCEN, ENSPR, CLRSPR;
DEFINE
    W502 = (STRT_FLG);
    W487 = (CO);
    W483 = (INC);
    W479 = (WAIT);
    W475 = (RDY);
    W473 = (DLY_POL);
    W462 = (SPRCYC);
    W450 = (STBIT0I);
    W447 = (STBIT1I);
    W437 = (STBIT2I);
    W434 = (STBIT3I);
    W431 = (STBIT4I);
    STBIT4O = (W429);
    STBIT3O = (W427);
    STBIT2O = (W425);
    STBIT1O = (W423);
    STBIT0O = (W407);
    LD_ = (W385);
    CI = (W382);
    FC = (W381);
    SC = (W358);
    LC_1 = (W357);
    LC = (W356);
    REQ = (W353);
    DUP = (W350);
    ENXAU = (W331);
    SE = (W329);
    CLRXAU = (W327);
    EOC = (W326);
    STBEN = (W323);
    CNVEN = (W315);
    YADRSEL = (W311);
```

```
YINCEN = (W309);
ENSPR = (W308);
CLRSPR = (W305);
M6(W299) =
  N1C(W483);
M5(W297) =
  N1D(W479);
M4(W296) =
  AND3B(W526, W299, W297);
M3(W290) =
  N1C(W462);
M2(W212) =
  N1E(W450);
M1(W192) =
  AND3B(W290, W212, W520);
M9(W166) =
  N1D(W434);
M10(W135) =
  AND3C(W519, W166, W517);
M11(W126) =
  ND3B(W296, W192, W135);
M12(W515) =
  ND2C(W526, W524);
M13(W88) =
  AND2C(W212, W520);
M14(W82) =
  N1D(W437);
M15(W79) =
  N1D(W431);
M16(W72) =
  AND3B(W82, W518, W79);
M17(W67) =
  ND3B(W123, W88, W72);
M18(W514) =
  AND3C(W526, W297, W290);
M19(W511) =
  AND3C(W212, W520, W519);
M20(W510) =
  AND2C(W518, W79);
M21(W508) =
  ND3C(W514, W511, W510);
M22(W507) =
  N1C(W475);
M23(W506) =
  AND2B(W526, W507);
M24(W504) =
  N1D(W447);
M25(W503) =
  AND2C(W212, W504);
M27(W498) =
  ND3C(W506, W503, W135);
M28(W525) =
  ND2C(W526, W297);
M29(W493) =
  AND2C(W521, W504);
M30(W490) =
  AND3B(W82, W166, W79);
M31(W489) =
  ND3C(W495, W493, W490);
M34(W482) =
  AND3B(W519, W518, W79);
M35(W481) =
  ND3C(W123, W503, W482);
M39(W471) =
  ND3B(W506, W503, W482);
M40(W469) =
  N1C(W502);
M41(W467) =
  ND2B(W469, W504);
M42(W465) =
  AND3C(W526, W483, W297);
M43(W463) =
  AND3B(W212, W520, W82);
```

```
M45(W459) =
  ND3C(W465, W463, W510);
M46(W458) =
  AND3C(W526, W297, W523);
M47(W453) =
  AND3B(W290, W212, W504);
M49(W449) =
  ND3C(W458, W453, W135);
M51(W446) =
  AND3B(W521, W520, W519);
M52(W445) =
  AND2C(W166, W79);
M53(W442) =
  ND3C(W514, W446, W445);
M55(W435) =
  AND3C(W521, W520, W82);
M57(W433) =
  ND3C(W458, W435, W445);
M61(W426) =
  ND3C(W458, W435, W510);
M64(W422) =
  AND3B(W519, W166, W79);
M65(W421) =
  ND3C(W495, W503, W422);
M66(W417) =
  N1C(W487);
M67(W414) =
  AND3C(W526, W417, W483);
M68(W413) =
  AND3B(W507, W212, W520);
M69(W411) =
  AND2B(W82, W166);
M70(W410) =
  ND3C(W414, W413, W411);
M71(W409) =
  ND3B(W469, W166, W79);
M73(W401) =
  AND3B(W297, W523, W290);
M74(W399) =
  ND2B(W212, W520);
M75(W398) =
  ND2B(W82, W166);
M76(W395) =
  NR2B(W399, W398);
M77(W394) =
  ND3B(W414, W401, W395);
M78(W391) =
  ND2B(W469, W82);
M79(W389) =
  AND2B(W526, W212);
M80(W387) =
  AND2C(W504, W82);
M82(W383) =
  ND3B(W389, W387, W445);
M85(W516) =
  ND2C(W518, W517);
M86(W377) =
  ND3B(W514, W511, W378);
M87(W374) =
  ND2B(W469, W212);
M88(W373) =
  ND2B(W526, W417);
M89(W372) =
  ND2B(W483, W297);
M90(W370) =
  NR2C(W373, W372);
M91(W369) =
  ND2B(W523, W522);
M92(W368) =
  ND2B(W212, W504);
M93(W366) =
  NR2B(W369, W368);
M94(W362) =
  AND3C(W519, W518, W517);
```

```
M95(W360) =
  ND3C(W370, W366, W362);
M99(W354) =
  ND2B(W523, W290);
M101(W352) =
  NR2B(W354, W368);
M103(W347) =
  ND3C(W370, W352, W362);
M104(W345) =
  AND2B(W526, W417);
M105(W343) =
  AND2B(W523, W522);
M106(W342) =
  AND3B(W212, W520, W517);
M107(W341) =
  ND3B(W345, W343, W342);
M108(W339) =
  AND3C(W526, W487, W483);
M109(W338) =
  AND3B(W297, W522, W212);
M110(W337) =
  ND2B(W504, W519);
M111(W335) =
  ND2B(W518, W517);
M112(W334) =
  NR2C(W337, W335);
M113(W333) =
  ND3C(W339, W338, W334);
M115(W330) =
  AND3B(W297, W290, W212);
M119(W324) =
  ND3C(W339, W330, W334);
M121(W320) =
  AND3B(W297, W523, W212);
M122(W319) =
  AND3C(W520, W82, W166);
M123(W316) =
  ND3C(W414, W320, W319);
M125(W313) =
  AND3B(W297, W507, W212);
M129(W306) =
  ND3C(W414, W313, W334);
M131(W303) =
  AND3B(W507, W212, W504);
M132(W302) =
  AND2B(W519, W518);
M133(W300) =
  ND3B(W414, W303, W302);
M137(W293) =
  ND3B(W458, W453, W302);
M139(W289) =
  AND3B(W522, W521, W520);
M140(W252) =
  AND3B(W82, W166, W517);
M141(W240) =
  ND3C(W465, W289, W252);
M145(W163) =
  ND3C(W339, W338, W319);
M147(W130) =
  AND3B(W290, W521, W520);
M149(W125) =
  ND3C(W465, W130, W252);
M151(W95) =
  AND3B(W522, W212, W504);
M153(W87) =
  ND3C(W458, W95, W135);
M154(W84) =
  AND2B(W522, W212);
M155(W83) =
  AND2B(W504, W519);
M157(W80) =
  ND3B(W84, W83, W510);
M161(W66) =
  ND3C(W339, W330, W319);
```

```
M162(W63) =
  AND3B(W526, W487, W299);
M163(W32) =
  AND3B(W297, W212, W504);
M165(W513) =
  ND3C(W63, W32, W362);
M166(W512) =
  AND3B(W526, W417, W299);
M169(W509) =
  ND3C(W512, W32, W362);
M173(W505) =
  ND3B(W458, W453, W510);
M177(W501) =
  ND3B(W414, W413, W490);
M178(W500) =
  N1B(W473);
M179(W499) =
  AND2B(W526, W500);
M181(W497) =
  AND2B(W519, W517);
M182(W496) =
  ND3B(W499, W493, W497);
M184(W494) =
  AND3B(W297, W212, W520);
M186(W492) =
  ND3B(W339, W494, W490);
M187(W491) =
  AND3C(W526, W297, W522);
M190(W488) =
  ND3C(W491, W446, W445);
M192(W486) =
  AND2B(W523, W212);
M193(W485) =
  AND3B(W504, W518, W79);
M194(W484) =
  ND3C(W495, W486, W485);
M198(W480) =
  ND3C(W458, W435, W378);
M200(W478) =
  AND2B(W507, W521);
M201(W477) =
  AND3B(W520, W82, W79);
M202(W476) =
  ND3C(W495, W478, W477);
M204(W474) =
  AND3B(W212, W504, W82);
M206(W472) =
  ND3C(W491, W474, W378);
M208(W470) =
  AND3B(W521, W504, W519);
M210(W468) =
  ND3C(W491, W470, W378);
M212(W466) =
  AND3B(W524, W212, W520);
M214(W464) =
  ND3C(W414, W466, W411);
M217(W461) =
  AND2B(W166, W517);
M218(W460) =
  ND3C(W296, W435, W461);
M221(W457) =
  AND2B(W519, W166);
M222(W456) =
  ND3C(W465, W192, W457);
M223(W455) =
  AND2B(W526, W487);
M224(W454) =
  AND2B(W299, W212);
M226(W452) =
  ND3B(W455, W454, W319);
M227(W451) =
  AND2B(W526, W299);
M230(W448) =
  ND3C(W451, W88, W72);
```

```
M234(W444) =
  ND3C(W514, W474, W378);
M235(W443) =
  AND2B(W526, W522);
M237(W441) =
  AND3B(W82, W518, W517);
M238(W440) =
  ND3C(W443, W88, W441);
M239(W439) =
  AND2C(W526, W483);
M240(W438) =
  AND2B(W297, W522);
M242(W436) =
  ND3C(W439, W438, W511);
M246(W432) =
  ND3C(W296, W511, W445);
M248(W430) =
  AND3B(W521, W504, W82);
M250(W428) =
  ND3C(W491, W430, W378);
M254(W424) =
  ND3C(W514, W463, W378);
M258(W420) =
  ND3C(W514, W470, W378);
M259(W419) =
  AND3B(W526, W417, W524);
M260(W418) =
  AND3B(W212, W504, W519);
M262(W416) =
  ND3C(W419, W418, W378);
M263(W415) =
  AND3B(W526, W487, W524);
M266(W412) =
  ND3B(W415, W418, W378);
M270(W408) =
  ND3C(W514, W430, W378);
M272(W406) =
  AND2B(W297, W521);
M273(W405) =
  AND2B(W504, W79);
M274(W404) =
  ND3B(W439, W406, W405);
M275(W403) =
  AND2B(W526, W521);
M276(W402) =
  AND2B(W520, W82);
M278(W400) =
  ND3B(W403, W402, W378);
M281(W397) =
  AND2B(W82, W518);
M282(W396) =
  ND3B(W465, W192, W397);
M285(W393) =
  AND3B(W520, W82, W518);
M286(W392) =
  ND3C(W495, W478, W393);
M288(W390) =
  AND2B(W521, W520);
M290(W388) =
  ND3C(W123, W390, W422);
M292(W386) =
  AND2B(W524, W212);
M294(W384) =
  ND3C(W455, W386, W319);
M298(W380) =
  ND3C(W506, W503, W510);
M299(W379) =
  ND4B(W526, W504, W519, W79);
M302(W376) =
  AND3B(W520, W519, W518);
M303(W375) =
  ND3C(W495, W84, W376);
M307(W371) =
  ND3C(W451, W88, W411);
```

```
M311(W367) =
  ND3C(W443, W88, W497);
M313(W365) =
  AND2B(W522, W521);
M314(W364) =
  AND3B(W504, W166, W517);
M315(W363) =
  ND3C(W495, W365, W364);
M317(W361) =
  AND2B(W290, W521);
M319(W359) =
  ND3C(W495, W361, W364);
M323(W355) =
  ND3C(W495, W493, W510);
M327(W351) =
  ND3B(W439, W406, W387);
M329(W349) =
  AND2B(W212, W518);
M330(W348) =
  ND3B(W123, W349, W517);
M332(W346) =
  AND2B(W297, W212);
M334(W344) =
  ND3B(W451, W346, W402);
M338(W340) =
  ND3B(W495, W361, W405);
M342(W336) =
  ND3C(W389, W387, W461);
M346(W332) =
  ND3C(W123, W503, W457);
M350(W328) =
  ND3C(W495, W493, W457);
M353(W325) =
  ND3B(W389, W387, W518);
M356(W322) =
  AND2B(W504, W166);
M357(W321) =
  ND3B(W439, W406, W322);
M360(W318) =
  AND2B(W520, W518);
M361(W317) =
  ND3C(W439, W346, W318);
M364(W314) =
  ND3B(W123, W493, W518);
M366(W312) =
  AND2B(W290, W504);
M368(W310) =
  ND3B(W495, W312, W445);
M371(W307) =
  ND3B(W123, W88, W518);
M374(W304) =
  ND3B(W123, W390, W82);
M377(W301) =
  ND3B(W123, W493, W519);
M380(W298) =
  ND3B(W123, W88, W519);
M383(W295) =
  ND3B(W123, W402, W517);
M384(W294) =
  ND4B(W526, W524, W521, W82);
M386(W292) =
  AND2B(W212, W519);
M387(W291) =
  ND3B(W123, W292, W517);
M390(W288) =
  ND3B(W123, W493, W517);
M391(W287) =
  ND4B(W526, W524, W82, W518);
M392(W286) =
  AND2B(W508, W498);
M393(W285) =
  AND2B(W426, W383);
M394(W284) =
  AND2B(W360, W341);
```

```
M395(W283) =
  ND3B(W286, W285, W284);
M396(W282) =
  AND2B(W240, W87);
M397(W281) =
  AND2B(W513, W509);
M398(W280) =
  ND3B(W282, W281, W505);
M399(W279) =
  NR2B(W283, W280);
M400(W278) =
  AND2B(W501, W496);
M401(W277) =
  AND2B(W472, W468);
M402(W276) =
  AND2C(W464, W460);
M403(W275) =
  ND3B(W278, W277, W276);
M404(W274) =
  AND2B(W456, W440);
M405(W273) =
  AND2B(W428, W420);
M406(W272) =
  ND3B(W274, W273, W400);
M407(W271) =
  NR2B(W275, W272);
M408(W270) =
  AND2B(W396, W384);
M409(W269) =
  AND2B(W371, W367);
M410(W268) =
  AND2B(W363, W348);
M411(W267) =
  ND3B(W270, W269, W268);
M412(W266) =
  AND2B(W340, W310);
M413(W265) =
  AND2B(W295, W291);
M414(W264) =
  ND3B(W266, W265, W288);
M415(W263) =
  NR2B(W267, W264);
M416(W429) =
  ND3B(W279, W271, W263);
M417(W262) =
  AND2B(W126, W508);
M418(W261) =
  AND2B(W481, W459);
M419(W260) =
  ND3B(W262, W261, W449);
M420(W259) =
  AND2B(W442, W426);
M421(W258) =
  AND2B(W360, W324);
M422(W257) =
  ND3B(W259, W258, W306);
M423(W256) =
  NR2B(W260, W257);
M424(W255) =
  AND2B(W125, W66);
M425(W254) =
  AND2B(W509, W501);
M426(W253) =
  ND3B(W255, W254, W484);
M428(W251) =
  AND2B(W464, W448);
M429(W250) =
  ND3B(W277, W251, W440);
M430(W249) =
  NR2B(W253, W250);
M431(W248) =
  AND2B(W428, W416);
M432(W247) =
  AND2B(W392, W380);
```

```
M433(W246) =
  AND2B(W375, W359);
M434(W245) =
  ND3B(W248, W247, W246);
M435(W244) =
  AND2B(W355, W336);
M436(W243) =
  AND2B(W314, W307);
M437(W242) =
  ND3B(W244, W243, W287);
M438(W241) =
  NR2B(W245, W242);
M439(W427) =
  ND3B(W256, W249, W241);
M441(W239) =
  AND2B(W498, W449);
M442(W238) =
  ND3B(W262, W239, W426);
M443(W237) =
  ND4B(W360, W333, W163, W87);
M444(W236) =
  NR2B(W238, W237);
M445(W235) =
  AND2B(W509, W488);
M446(W234) =
  AND2B(W468, W456);
M447(W233) =
  ND3B(W235, W234, W444);
M448(W232) =
  ND4B(W436, W432, W424, W416);
M449(W231) =
  NR2B(W233, W232);
M450(W230) =
  AND2B(W408, W388);
M451(W229) =
  AND2B(W379, W375);
M452(W228) =
  ND3B(W230, W229, W367);
M453(W227) =
  ND4B(W332, W328, W301, W298);
M454(W226) =
  NR2B(W228, W227);
M455(W425) =
  ND3B(W236, W231, W226);
M456(W225) =
  AND2B(W126, W67);
M457(W224) =
  AND2B(W508, W459);
M458(W223) =
  AND3B(W442, W433, W410);
M459(W222) =
  ND3B(W225, W224, W223);
M460(W221) =
  AND2B(W347, W333);
M461(W220) =
  AND2B(W324, W316);
M462(W219) =
  AND2B(W306, W240);
M463(W218) =
  ND3B(W221, W220, W219);
M464(W217) =
  NR2B(W222, W218);
M465(W216) =
  AND2B(W163, W125);
M466(W215) =
  AND2B(W66, W513);
M467(W214) =
  AND3B(W488, W480, W476);
M468(W213) =
  ND3B(W216, W215, W214);
M470(W211) =
  AND2B(W456, W448);
M471(W210) =
  AND2B(W440, W436);
```

```
M472(W209) =
  ND3B(W276, W211, W210);
M473(W208) =
  NR2B(W213, W209);
M474(W207) =
  AND2B(W432, W424);
M475(W206) =
  AND2B(W412, W392);
M476(W205) =
  AND2B(W388, W384);
M477(W204) =
  ND3B(W207, W206, W205);
M478(W203) =
  AND2B(W375, W371);
M479(W202) =
  AND2B(W367, W304);
M480(W201) =
  AND2B(W298, W295);
M481(W200) =
  ND3B(W203, W202, W201);
M482(W199) =
  NR2B(W204, W200);
M483(W423) =
  ND3B(W217, W208, W199);
M484(W198) =
  AND2B(W489, W410);
M485(W197) =
  AND2B(W377, W333);
M486(W196) =
  ND3B(W198, W197, W306);
M487(W195) =
  ND4B(W240, W163, W513, W488);
M488(W194) =
  NR2B(W196, W195);
M489(W193) =
  AND2B(W476, W468);
M491(W191) =
  ND3B(W193, W276, W452);
M492(W190) =
  ND4B(W428, W412, W408, W392);
M493(W189) =
  NR2B(W191, W190);
M494(W188) =
  ND4B(W388, W384, W363, W359);
M495(W187) =
  ND4B(W355, W328, W301, W294);
M496(W186) =
  NR2B(W188, W187);
M497(W407) =
  ND3B(W194, W189, W186);
M498(W185) =
  AND2B(W498, W481);
M499(W184) =
  AND2B(W471, W467);
M500(W183) =
  AND3B(W449, W442, W433);
M501(W182) =
  ND3B(W185, W184, W183);
M502(W181) =
  AND2B(W426, W421);
M503(W180) =
  AND2B(W410, W409);
M504(W179) =
  AND3B(W391, W374, W360);
M505(W178) =
  ND3B(W181, W180, W179);
M506(W177) =
  NR2B(W182, W178);
M507(W176) =
  AND2B(W333, W324);
M508(W175) =
  AND2B(W316, W306);
M509(W174) =
  AND3B(W293, W240, W163);
```

```
M510(W173) =
  ND3B(W176, W175, W174);
M511(W172) =
  AND2B(W125, W87);
M512(W171) =
  AND2B(W80, W66);
M513(W170) =
  AND3B(W513, W509, W488);
M514(W169) =
  ND3B(W172, W171, W170);
M515(W168) =
  NR2B(W173, W169);
M516(W167) =
  AND2B(W480, W476);
M518(W165) =
  AND3B(W416, W412, W392);
M519(W164) =
  ND3B(W167, W276, W165);
M521(W162) =
  AND2B(W371, W336);
M522(W161) =
  AND3B(W332, W325, W304);
M523(W160) =
  ND3B(W205, W162, W161);
M524(W159) =
  NR2B(W164, W160);
M525(W385) =
  ND3B(W177, W168, W159);
M526(W158) =
  AND2B(W449, W433);
M527(W157) =
  AND2B(W394, W347);
M528(W382) =
  ND3B(W158, W157, W505);
M529(W381) =
  ND4B(W498, W421, W332, W325);
M530(W358) =
  ND4B(W481, W471, W449, W87);
M531(W156) =
  AND3B(W67, W442, W333);
M532(W155) =
  AND3B(W324, W240, W125);
M533(W154) =
  AND3B(W492, W488, W448);
M534(W357) =
  ND3B(W156, W155, W154);
M535(W153) =
  ND3B(W498, W481, W449);
M536(W152) =
  ND2B(W433, W426);
M537(W151) =
  NR2B(W153, W152);
M538(W150) =
  ND3B(W410, W360, W347);
M539(W149) =
  ND2B(W316, W300);
M540(W148) =
  NR2B(W150, W149);
M541(W147) =
  ND3B(W87, W484, W480);
M542(W146) =
  ND3B(W476, W392, W380);
M543(W145) =
  NR2B(W147, W146);
M544(W353) =
  ND3B(W151, W148, W145);
M545(W144) =
  ND2B(W459, W442);
M546(W143) =
  ND2B(W421, W333);
M547(W142) =
  NR2B(W144, W143);
M548(W141) =
  ND2B(W324, W240);
```

```
M549(W140) =
  ND2B(W163, W125);
M550(W139) =
  NR2B(W141, W140);
M551(W138) =
  ND2B(W66, W488);
M552(W137) =
  ND2B(W472, W444);
M553(W136) =
  NR2B(W138, W137);
M554(W350) =
  ND3B(W142, W139, W136);
M556(W134) =
  AND2B(W489, W442);
M557(W133) =
  AND2B(W433, W426);
M558(W132) =
  ND3B(W262, W134, W133);
M559(W131) =
  AND2B(W377, W360);
M561(W129) =
  ND3B(W131, W176, W316);
M562(W128) =
  NR2B(W132, W129);
M563(W127) =
  AND2B(W293, W240);
M566(W124) =
  ND3B(W127, W216, W215);
M568(W122) =
  AND2B(W480, W460);
M569(W121) =
  ND3B(W235, W122, W456);
M570(W120) =
  NR2B(W124, W121);
M571(W119) =
  AND2B(W436, W432);
M572(W118) =
  AND2B(W428, W408);
M573(W117) =
  AND2B(W375, W363);
M574(W116) =
  ND3B(W119, W118, W117);
M575(W115) =
  AND2B(W359, W355);
M576(W114) =
  AND2B(W344, W328);
M577(W113) =
  ND3B(W115, W114, W317);
M578(W112) =
  NR2B(W116, W113);
M579(W331) =
  ND3B(W128, W120, W112);
M580(W111) =
  ND4B(W449, W442, W433, W421);
M581(W110) =
  ND4B(W360, W347, W333, W324);
M582(W109) =
  NR2B(W111, W110);
M583(W108) =
  ND4B(W316, W240, W163, W125);
M584(W107) =
  ND4B(W87, W66, W488, W484);
M585(W106) =
  NR2B(W108, W107);
M586(W105) =
  ND4B(W472, W456, W444, W436);
M587(W104) =
  ND4B(W404, W351, W321, W317);
M588(W103) =
  NR2B(W105, W104);
M589(W329) =
  ND3B(W109, W106, W103);
M590(W102) =
  ND2B(W481, W471);
```

```
M591(W101) =
  ND2B(W467, W409);
M592(W100) =
  NR2B(W102, W101);
M593(W99) =
  ND2B(W391, W383);
M594(W98) =
  ND2B(W374, W80);
M595(W97) =
  NR2B(W99, W98);
M596(W96) =
  AND3B(W468, W420, W336);
M597(W327) =
  ND3B(W100, W97, W96);
M598(W326) =
  ND2B(W468, W420);
M600(W94) =
  AND2B(W360, W347);
M601(W93) =
  AND3B(W316, W87, W484);
M602(W323) =
  ND3B(W158, W94, W93);
M603(W92) =
  AND2B(W67, W459);
M604(W91) =
  AND2B(W442, W433);
M605(W90) =
  AND2B(W426, W410);
M606(W89) =
  ND3B(W92, W91, W90);
M609(W86) =
  ND3B(W94, W176, W316);
M610(W85) =
  NR2B(W89, W86);
M614(W81) =
  ND3B(W219, W216, W215);
M617(W78) =
  ND3B(W235, W167, W464);
M618(W77) =
  NR2B(W81, W78);
M619(W76) =
  AND2B(W460, W448);
M620(W75) =
  AND2B(W440, W432);
M621(W74) =
  AND2B(W424, W416);
M622(W73) =
  ND3B(W76, W75, W74);
M624(W71) =
  AND2B(W384, W371);
M625(W70) =
  AND2B(W304, W295);
M626(W69) =
  ND3B(W206, W71, W70);
M627(W68) =
  NR2B(W73, W69);
M628(W315) =
  ND3B(W85, W77, W68);
M631(W65) =
  ND3B(W239, W91, W426);
M632(W64) =
  AND2B(W410, W360);
M634(W62) =
  ND3B(W64, W221, W324);
M635(W61) =
  NR2B(W65, W62);
M636(W60) =
  AND2B(W316, W300);
M637(W59) =
  AND2B(W240, W163);
M638(W58) =
  ND3B(W60, W59, W125);
M639(W57) =
  AND2B(W87, W66);
```

```
M640(W56) =
  AND2B(W488, W484);
M641(W55) =
  ND3B(W57, W56, W480);
M642(W54) =
  NR2B(W58, W55);
M643(W53) =
  AND2B(W476, W456);
M644(W52) =
  AND2B(W436, W404);
M645(W51) =
  ND3B(W53, W52, W392);
M646(W50) =
  AND2B(W388, W380);
M647(W49) =
  AND2B(W351, W321);
M648(W48) =
  ND3B(W50, W49, W317);
M649(W47) =
  NR2B(W51, W48);
M650(W311) =
  ND3B(W61, W54, W47);
M651(W46) =
  AND3B(W126, W508, W498);
M652(W45) =
  AND3B(W489, W481, W449);
M653(W44) =
  ND2B(W442, W433);
M654(W43) =
  ND2B(W426, W421);
M655(W42) =
  NR2B(W44, W43);
M656(W41) =
  ND3B(W46, W45, W42);
M657(W40) =
  AND3B(W410, W377, W360);
M658(W39) =
  AND3B(W347, W333, W324);
M659(W38) =
  ND2B(W316, W306);
M660(W37) =
  ND2B(W240, W163);
M661(W36) =
  NR2B(W38, W37);
M662(W35) =
  ND3B(W40, W39, W36);
M663(W34) =
  NR2B(W41, W35);
M664(W33) =
  AND3B(W125, W87, W66);
M666(W31) =
  ND2B(W484, W480);
M667(W30) =
  ND2B(W476, W472);
M668(W29) =
  NR2B(W31, W30);
M669(W28) =
  ND3B(W33, W170, W29);
M670(W27) =
  AND3B(W468, W464, W460);
M671(W26) =
  AND3B(W456, W448, W444);
M672(W25) =
  ND2B(W440, W436);
M673(W24) =
  ND2B(W432, W428);
M674(W23) =
  NR2B(W25, W24);
M675(W22) =
  ND3B(W27, W26, W23);
M676(W21) =
  NR2B(W28, W22);
M677(W20) =
  ND2B(W424, W408);
```

```
M678(W19) =
  ND2B(W392, W388);
M679(W18) =
  NR2B(W20, W19);
M680(W17) =
  ND2B(W384, W380);
M681(W16) =
  ND2B(W375, W371);
M682(W15) =
  NR2B(W17, W16);
M683(W14) =
  AND3B(W367, W363, W359);
M684(W13) =
  ND3B(W18, W15, W14);
M685(W12) =
  AND3B(W355, W336, W332);
M686(W11) =
  AND3B(W328, W317, W301);
M687(W10) =
  ND2B(W298, W294);
M688(W9) =
  ND2B(W291, W287);
M689(W8) =
  NR2B(W10, W9);
M690(W7) =
  ND3B(W12, W11, W8);
M691(W6) =
  NR2B(W13, W7);
M692(W308) =
  ND3B(W34, W21, W6);
M693(W5) =
  AND2B(W467, W409);
M694(W4) =
  AND2B(W391, W383);
M695(W3) =
  AND2B(W374, W420);
M696(W305) =
  ND3B(W5, W4, W3);
M697(W356) =
  N1B(W459);
M698(W309) =
  N1B(W489);
M665(W123) =
  N1D(W515);
M633(W378) =
  N1D(W516);
M630(W517) =
```

APPENDIX E

TRANS/4 USER GUIDE

Important Notice

Restrictions on the use of this document:

This document is delivered subject to the following conditions and restrictions:

This documentation contains proprietary information of SCITEX CORPORATION, LTD. Such information is hereby supplied solely for the purpose of assisting explicitly and properly authorized users of the RESPONSE series of SCITEX systems in the proper operation of SCITEX equipment. Without the express prior written permission of SCITEX, no part of the contents hereof may be used for any other purpose, disclosed to any person or firm, or reproduced by any means.

The text and drawings herein are for the purposes of illustration and reference only. The specifications on which they are based are subject to change without notice.

Document No.771-9A005
Copyright © 1990 by
SCITEX CORPORATION, LTD.
All rights reserved.

Preliminary: December 1990

Trademarks:

Color Key®, Cromalin®, Agfaproof™

1. TRANS/4 OPERATION

1.1 INTRODUCTION TO TRANS/4

TRANS/4 is used for color proofing on the Iris Printer and consists of software that is resident on a Scitex workstation.

The Iris printer, together with the Scitex workstation, consistently gives an accurate reproduction of the press system which would be used on a final printing job. TRANS/4 sends picture data files from the workstation directly to the Iris printer, eliminating the need to generate films for each separation. Instead of spending several hours producing a color proof from films (e.g. Cromalin, Matchprint, etc.), the Iris printer produces a precise proof in only minutes and at a fraction of the cost.

FACTORY-SET CALIBRATIONS

TRANS/4 has been calibrated at the factory to simulate several proofing and printing systems. A specific list of these systems is provided with the magnetic tape which is supplied with the TRANS/4 system.

For every factory-calibrated system, a corresponding Color Transform file (type NDL) is supplied on the magnetic tape. When applying a particular Color Transform to a page, a color match of the target printing system is obtained. Proofing is a matter of simply specifying the appropriate Color Transform file when printing to the Iris.

CUSTOM CALIBRATIONS

One of the powerful features of TRANS/4 is its capability of being calibrated to most any printing environment. The user can optionally create his own Color Transforms in order to simulate a non-standard (not supplied by Scitex) press system. To do this, the Custom-Calibration Procedure (Chapter 3.) must be performed.

The Calibration Procedure

The calibration procedure is required once per target printing process and not each time a proof is output. As long as the final printing process or conditions do not change, the system is calibrated for that process (see Chapter 3. Custom Calibration).

Calibration consists of several procedures which require the use of a colorimeter. A reference pattern is printed on the target press system via films as well as directly to the Iris printer. The goal of calibration is to produce a proof which matches the press print. These two outputs are measured precisely and data is entered into the Scitex workstation. TRANS/4 is then able to create the appropriate Color Transform.

Once the calibration procedure is complete and there is a proper match, the system need not be calibrated for that printing process again. TRANS/4 is capable of storing virtually an unlimited number of sets of calibration data which reflect different printing processes. By specifying the desired data set, the Iris can simulate, on-the-fly, any printing process which has been previously calibrated.

1.2 PRINTING ON THE IRIS PRINTER

To output Scitex files onto the Iris printer, a command originating from the Iris Front-End-Processor (FEP) must first be sent to the Whisper workstation. This makes sure that the FEP is ready and waiting to receive the data to be printed.

Next, from the Whisper workstation, the command to begin proofing is sent to the FEP. A CT, LW or Final Layout file could be printed. A Color Transform file could also be specified so that the proof obtained, simulates some target printing method.

STEP 1. THE IRIS PRINTER

Place a sheet of paper onto the drum of the Iris Color Printer. (Read your Iris Operator's Manual for details.) Close the hood and put the printer on-line.

STEP 2. THE IRIS FEP

From the Iris FEP keyboard, select I/O AND FILES. Then select Pipe. This command ensures that the FEP is ready to receive data. Make sure that CLT and HUE fields have been disabled via the EDIT selection. The following screen appears:

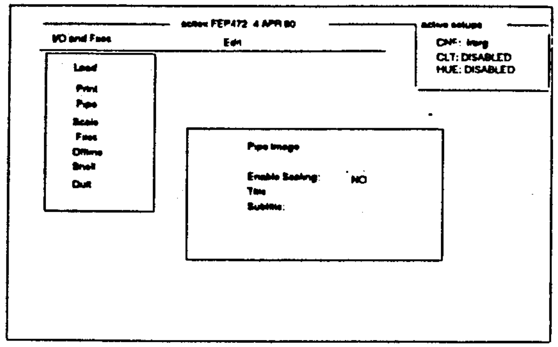

Enter the following parameters ,if necessary, and continue to step 3.

*Enable Scaling*

Change this field to YES in order to scale the file on the fly. Usually, this field would be set to NO and any scaling will be done on the Scitex workstation.

*Title, Subtitle*

These fields allow you to add two lines of labels outside the print area of the proof. Enter information here such as the file name, color transformation, date, etc.

You may enter Edit before selecting I/O and Files in order to change parameters such as Offset, etc.

STEP 3. THE SCITEX STATION

On the Whisper, Select Start Work and choose the name of the file to be proofed. From the pop-up menu, select Proof to proof to the Iris printer. LW, CT and Final Layout files may be proofed Note, that the Color Transform file (NDL) must be located either in the "Public" table or in the current Job and Page you are working on.

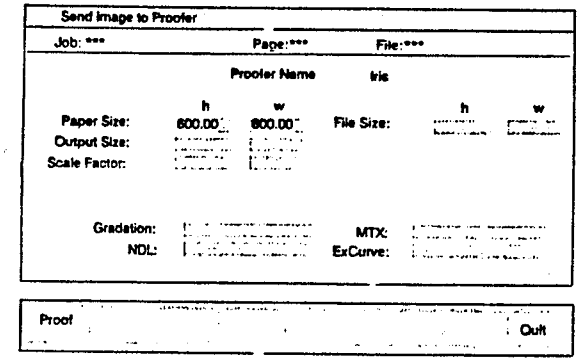

Enter the parameters which are pertinent to your printing requirements and select the Proof softkey to initiate the printing. At this point you may continue your other work and the printing will continue in the background. When printing is complete a message will be flashed on your screen.

PARAMETERS TO BE ENTERED

*NDL*

Type the name of the Color Transform to apply to the file to be printed, if any.

*Excurve File*

If you do not use the factory default, type the name of the Excurve which has been created. (Refer to Chapter 3, Custom Calibration.)

PROOF

Pressing this softkey sends the page data to the Iris printer, via the FEP.

At the FEP, you will be prompted to press ENTER .

QUIT

Pressing this softkey aborts the operation.

*Paper Size*

The paper size is fixed to 600 x 600 mm for Iris 3024; 863 x 1189 mm for Iris 3047; and 305 x 457 mm for Iris Smartjet 4012.

*File Size*

These fields display the height and width of the selected file.

*Output Size*

The default output size is the size of the selected file. Change these values in order to scale the picture up and down. Output size may not exceed the paper size. Changing this field changes the Scale Factor field.

*Scale Factor*

To enlarge or reduce the picture. Changing this field changes the Output Size field.

*Gradation*

Type the name of the gradation curve to be applied to the file, if any.

*MTX*

Type the name of the Matrix to be applied to the file, if any.

2. TRANS/4 INSTALLATION

2.1 HARDWARE

TRANS/4 requires the following equipment:

- Any Whisper Cabinet with four available slots to accommodate the following required boards:
  - HSP (High Speed Processor - 2 boards)
  - PM (Picture Memory) Board
  - GPIB Board (Handshake)
  - SCD Board (attaches to CPU board)
- Iris 3024/3047/4012 Color Ink Jet Proofer
- Iris Front-End-Processor (FEP)
- X-Rite 918F Colorimeter (optional)
- Cable for X-Rite - SCD connection The figure on the next page shows how the equipment is connected. The Iris Color Ink Jet Proofer is connected to the Iris front-end-processor (FEP) as explained in the Iris Operator's Manual.

The Iris FEP is linked to the Whisper by way of the GPIB board and cable.

The X-Rite colorimeter connects to the Whisper via a cable to the SCD board.

NOTE:

- When using the X-RITE Colorimeter connected to the SCD, make sure FCO #12637 was performed.
- Refer to Appendix I, HSP Installation Procedure for Installation instructions for the High Speed Processor Board.

2.2 SYSTEM CONFIGURATION

When performing System Configuration, the TRANS/4 option must be enabled along with assigning the printer logical name (iris) to a physical GPIB channel number. All this is accomplished through the following series of dialogues:

First, press System, Services and Configuration softkeys from the I/O workstation in order to access the System Configuration Main Menu.

System Configuration

| | |
|---|---|
| Workstation Type | I/O |
| Station Name | CPU5 |
| Network | Yes |

Workstation Types:
I/O, Xcelerator, Assembler, Keyline, Smartview
Softproof, Fightouch, Assembler Plus, Prisma

| Save & Exit | Station Config | Storage Device | SciNet | Logical Names | MIS | Secur. Info | Quit |
|---|---|---|---|---|---|---|---|

From the System Configuration Main Menu, press the Secur. Info softkey and the following screen appears:

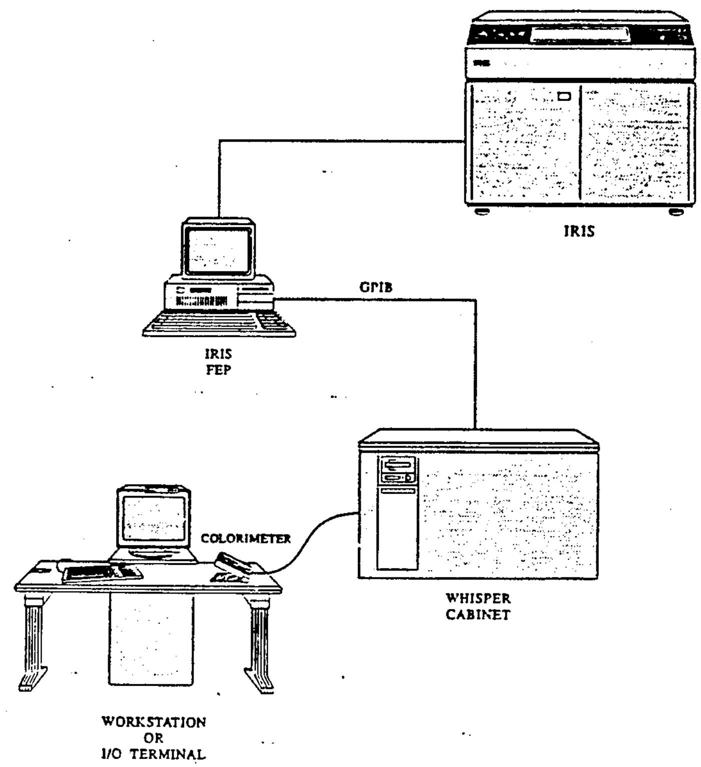

Figure 1. TRANS/4 Hardware Configuration

HandShake Configuration

Station Name CPU5

| Save & Exit | RS232 | GPIB | MT | Main Menu | STND | Quit |
|---|---|---|---|---|---|---|

Press the GPIB softkey and the following screen appears:

GPIB Configuration

GPIB Address 1: 1
GPIB Address 2:
GPIB Address 3:
GPIB Address 4:

Active Listen Mode: YES
Time Out (in sec): ~300

| Save & Exit | Enter | Main Menu | Quit |
|---|---|---|---|

Set the *GPIB Address 1* field to the channel number that the Iris printer is physically connected to on the GPIB board. Values may range from 1 - 4. Make sure the other parameters are set as shown.

Security Information

Workstation Type Assembler
Board S/N
Password

| Option | Open | Option | Open | Option | Open |
|---|---|---|---|---|---|
| Netway | ~NO | USFM | ~NO | DDES | ~NO |
| HandShake | ~YES | Optic | ~NO | MIS | ~NO |
| Visionary | ~NO | 3M | ~NO | TRANS/4 | ~YES |
| Text | ~YES | | | | |
| Customer # | 10 | | | | |

| Save & Exit | Main Menu | Quit |
|---|---|---|

The password for your system must be obtained from your Scitex Subsidiary Administrator. Be prepared to give him the serial # and workstation configuration. Set the options as they apply to your system, making sure that *HandShake* and *TRANS/4* are set to "YES". Press the Main Menu softkey to bring you back to the System Configuration Main Menu. From there press the Station Config and then Handsk Config softkeys to bring up the screen for setting up the Iris communications channel.

The next step is to assign this physical channel number to the Iris logical name. To do this press the Main Menu softkey which brings you back to the System Configuration Main Menu. Press the Logical Names softkey and the following appears:

Logical Names Assignment

Station Name CPU5

| Save & Exit | Remote LogNames | HandSk LogNames | Main Menu | Quit |
|---|---|---|---|---|

Press the Handsk LogNames key. This brings you to the screen on the next page:

HandShake Logical Names

Station Name CPU5

| Device Type | Channel Address | Logical Name |
|---|---|---|
| ~GPIB | ~1 | IRIS |

| Save & Exit | Enter | Main Menu | Quit |
|---|---|---|---|

Select the *device type* to be "GPIB" by toggling with the space bar. Select the physical channel number (as entered for GPIB configuration previously) under the *Channel Address*. The *Logical Name* should be set to "Iris". Now press the Save & Exit softkey to install all the parameters you have just set. The TRANS/4 system is now configured to run on your workstation.

2.3 COLOR BALANCE

The Color Balance procedure is done once for every Iris Installation. Its purpose is to initialize Iris Ink Jet color densities in order to calibrate your Iris printer to mimic the factory reference. The procedure described in this section should be performed only if Factory-Set Color Transforms will be used when proofing. If you intend to create your own Custom Color Transforms, skip this section and go on to Chapter 3. Custom Calibration.

The following is required for this procedure:

- The Factory-supplied proof of the sample pattern, referred to as the Color Wedge (included with this manual).
- The Color Wedge data file (COLWDG.P), resident on Magtape and supplied with TRANS/4.
- A densitometer (or colorimeter).

The outline of the Color Balance procedure is as follows:

- Measure the factory proof with your densitometer.
- Set the Iris Printer with density values of 100 for CMYB.
- Download the Color Wedge file from magtape to the Scitex station and create a proof of it on your Iris Ink Jet printer.
- Measure your proof and compare it to the factory proof measurements.
- Adjust the Iris density values accordingly.
- Create another proof of the Color Wedge on your Iris printer.
- Measure your proof. It should match the factory proof. If it doesn't, further adjustments may be necessary.

Color Balance - Detailed Description

The Color Wedge is the sample reference pattern which is used when setting the Color Balance on the Iris printer. With every TRANS/4 system, a factory proof of the Color Wedge is supplied. Note that this proof does not reflect the final printing quality and is used strictly for adjustment purposes. A magtape containing the file COLWDG.P is also supplied. Download this file into your workstation disk.

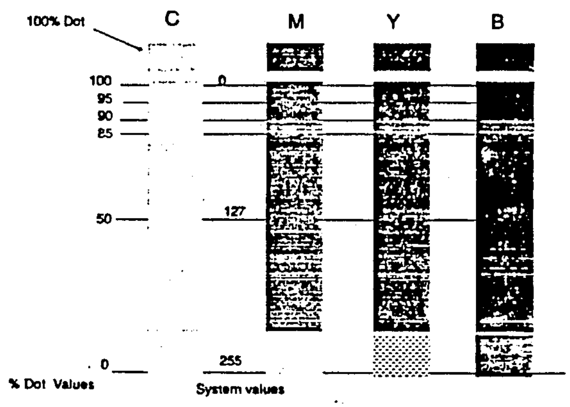

1. Measure the Factory Proof

With your densitometer (or colorimeter), measure the factory proof at 100% Dot for each of the four separations. Measure Cyan density for Set the densities to 100 for Cyan, Magenta, Yellow and Black.

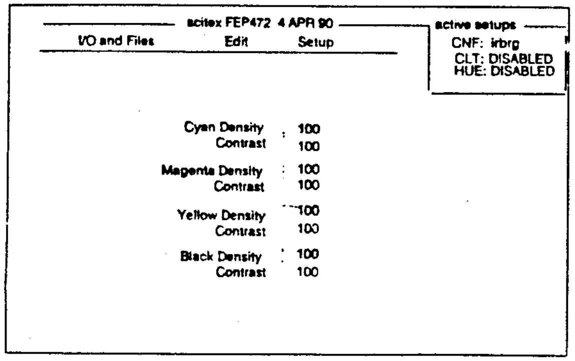

3. Create a proof of the Color Wedge on your Iris Printer

Make sure you have downloaded the Color Wedge file (COLWDG.P) from the magtape supplied with the system. Select the Proof option (as described in Chapter 1. TRANS/4 Operation), to print the Color Wedge on your system. Make sure you do not specify any gradation, MTX, NDL or Excurve file.

4. Measure your proof

With the densitometer, measure your proof starting with Cyan at 100% Dot. If your measurement here matches the factory proof measurement (as described in step 1.) then the Cyan density setting may remain at 100. If, however, it does not match, do the following: locate the position on your proof for Cyan where the densitometer reading is cyan; Magenta density for Magenta; Yellow density for Yellow and Black density for Black. Write these four values down.

2. Set the Iris densities to 100 for CMYB.

Set the color densities on the Iris Front-End-Processor (FEP) to 100 for C,M,Y and B. To enter the densities, o.1 the FEP, select SET UP, default configuration, with CLT and HUE disabled. Then select EDIT, Configuration and then Color Balance.

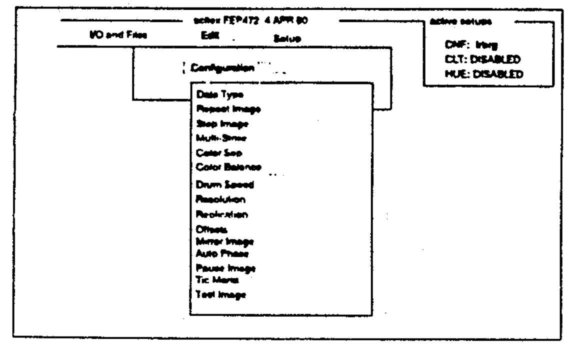

5. Adjust Iris Densities

After all density values have been determined, enter them into the FEP as was described in Step 2.

6. Create another proof

Output the Color Wedge once again, using the new density settings.

7. Measure your new proof

Measure the 100%Dot value for C,M,Y and B on your proof. These values should now closely match the values measured on the factory proof. If they don't, try to further adjust the Iris density settings by repeating steps 5. and 6. until the measurements are approximately equal.

8. Measure intermediary values on your proof

Once you are satisfied with matching 100%Dot values of the factory proof and your site's proof, measure several intermediary points (between 0%Dot and 100%Dot) on both proofs. Verify that they are "close." If there are wide discrepancies it is possible that the Excurve supplied with TRANS/4 is not adequate for your system. It may, therefore, be advisable to create a new Excurve. Refer to the *Creating an Optimal Excurve* section of Chapter 3. Custom Calibration, for instructions on how to create this Excurve.

the same as was measured from the factory proof at 100% Dot. This position on the scale represents the density which should be set. Write down the value and repeat the procedure for Magenta, Yellow and Black.

An Example

Suppose you measure the density of Cyan at 100% Dot on the factory proof and its value is 1.8. On your site's proof you locate density 1.8 for Cyan at the 80% Dot location on the Color Wedge. That means, you must set the Iris density for Cyan to be 80. The same procedure should be applied to the other colors.

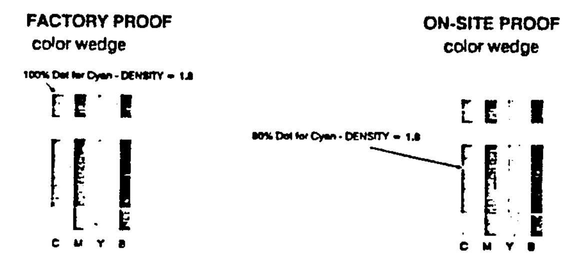

3. CUSTOM CALIBRATION (Optional)

Calibrating TRANS/4 is essential only when simulating a printing system whose Color Transform has not been supplied by the factory. The complete list of factory-calibrated Color Transforms is provided with the magnetic tape which is supplied with the TRANS/4 system.

Overview

When calibrating, it is necessary to establish that the Iris proofing system will simulate the press system being used.

The calibration methods described in this chapter adjust color parameters so that the Iris proofing system will consistently give an accurate reproduction of the desired printing method. The three procedures necessary for custom calibrations are:

- Adjusting The Color Balance
- Creating An Optimal Excurve
- Creating A Custom Color Transform

3.1 ADJUSTING THE COLOR BALANCE

This is the Color Balance procedure which is done when creating a custom Color Transform. (It replaces the Color Balance Procedure described in Chapter 2. Installation.) Its purpose is to initialize specific color parameters in order to achieve optimal results when proofing. It is done only once. If different Color Transforms are needed to be created, this adjustment does not have to be re-done.

In order to adjust the color balance, a sample pattern called the Color Wedge is printed on the Iris. This is provided by Scitex on magtap. With the aid of a colorimeter, the luminances will be measured. This section gives you a step-by-step approach to entering the proper data into the system.

THE CIELAB COLOR SYSTEM

Since color is a matter of personal perception and therefore subjective, a method of objectively appraising the color spectra must be used. Several reference systems exist and we have chosen to use the CIELAB color system when performing color match between proof and print.

The CIELAB space is a 3 dimensional uniform color space whose coordinates represent:

- "L", the luminance of a color;
- "a", the redness/greeness of a color;
- "b", the yellowness/blueness of a color.

With the aid of a colorimeter, a color can be uniquely defined and measured by these three values. Refer to the figure below which shows a 2 dimensional "slice" of the CIELAB color space where the L (luminance) value is held constant.

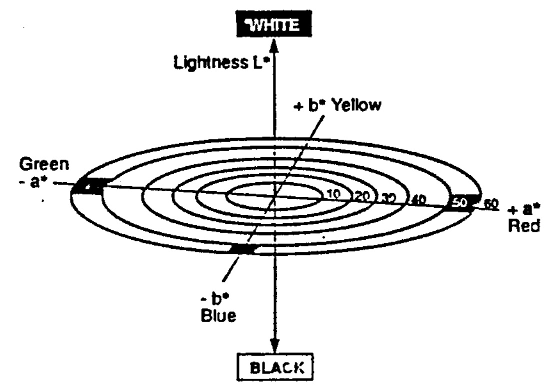

THE COLOR WEDGE

The Color Wedge is the sample reference pattern which is used when setting the Color Balance on the Iris. With every TRANS/4 system, a magtape containing the file COLWDG.P is received.

When this Color Wedge is printed, it appears as a pattern of 4 color strips (CMYB) with the lightness of points (luminance) varying over a range of 0 - 100% dot (or 255 - 0 when system values are used).

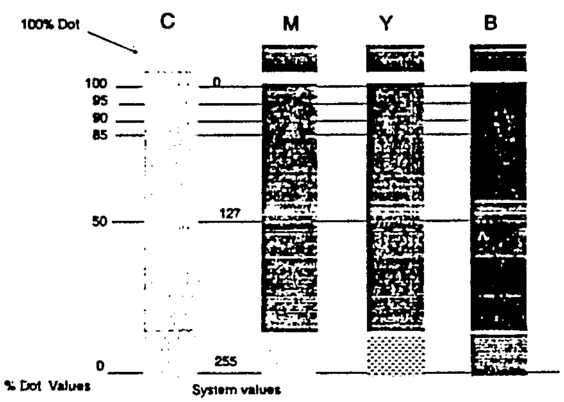

Set Densities on the Iris

The first step is to create a proof of the Color Wedge by outputting the COLWDG.P file to the Iris Printer. Refer to Chapter 1. for instructions on how to print files on the Iris printer.

Next, using the X-Rite 918 Colorimeter (refer to X-Rite Operation Manual), measure the luminance (L value on the X-Rite display) at 100% dot for Cyan. Write down this value on the form provided on the next page. Move the colorimeter down the scale by 5% dot to the 95% dot position. Measure the luminance and write it down. Continue measuring at 5% dot increments until you reach 50% dot. (Fewer measurements can be made at the middle range.)

Starting from 100% dot and going down, try to notice where the luminance values steadily rise. The place on the % dot scale where the luminance begins to increase consistently represents the the density value which should be set on the Iris FEP.

Repeat this procedure for Yellow, Magenta and Black

An example follows.

Baseline Density/ Luminance

| % Dot | CYAN | MAGENTA | YELLOW | BLACK |
|---|---|---|---|---|
| 100 % | | | | |
| 95 | | | | |
| 90 | | | | |
| 85 | | | | |
| 80 | | | | |
| 75 | | | | |
| 70 | | | | |
| 65 | | | | |
| 60 | | | | |
| 55 | | | | |
| 50 | | | | |
| 45 | | | | |
| 40 | | | | |
| 35 | | | | |
| 30 | | | | |
| 25 | | | | |
| 20 | | | | |
| 15 | | | | |
| 10 | | | | |
| 5 | | | | |
| 0 | | | | |
| | | | | |

Date:__________ Name:__________

Drum Speed:_______ Paper:__________

An Example

Suppose the luminances were measured for CMYB and the following form was filled in with this data.

Baseline Density/ Luminance

| % Dot | CYAN | MAGENTA | YELLOW | BLACK |
|---|---|---|---|---|
| 100 % | 55.77 | 50.02 | 88.11 | 11.69 |
| 95 | 55.49 | 49.81 | 87.46 | 10.48 |
| 90 | 55.54 | 50.02 | 88.06 | 10.99 |
| 85 | 55.75 | 49.90 | 87.69 | 10.42 |
| 80 | 55.63 | * 50.11 | 87.99 | 11.49 |
| 75 | * 56.42 | 50.46 | 87.69 | 9.33 |
| 70 | 58.18 | 51.48 | * 87.85 | * 12.08 |
| 65 | | | | |
| 60 | 60.89 | 53.73 | 88.34 | 17.22 |
| 55 | | | | |
| 50 | 63.66 | 55.84 | 88.69 | 22.51 |
| 45 | | | | |
| 40 | | | | |
| 35 | | | | |
| 30 | | | | |
| 25 | | | | |
| 20 | | | | |
| 15 | | | | |
| 10 | | | | |
| 5 | | | | |
| 0 | | | | |
| | | | | |

Find the low point, or minimum, at which the luminance values start to steadily rise. Look at our example: after some initial fluctuation, the luminance rises steadily at 75% dot for Cyan from a minimum value of 56.42. Likewise, for Magenta, the low point would be at 80% dot. For Yellow - 70% dot and for Black - 70% dot.

ENTER THE DENSITY DATA

To enter the new densities on the Iris FEP, select SET UP, default configuration, with CLT and HUE disabled. Then select EDIT ,Configuration and then Color Balance .

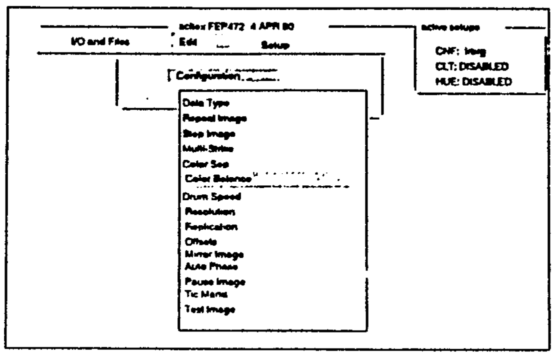

3.2 CREATING AN OPTIMAL EXCURVE

This procedure creates an Excurve which is necessary for creating Color Transforms. Steps 1-5 outlined below, need only be done once - before creating the first custom Color Transform. Afterwards, it need not be repeated. Steps 6 - 9, however, require a press system print and need to be re-done for every custom Color Transform.

Before creating an Excurve, be sure that you have read the previous section of this chapter and have already adjusted the Color Balance on the Iris printer.

To create the Excurve, follow the steps below:

1. Create a Proof

Create a new proof of the sample Color Wedge pattern or use the last proof which was produced when *Adjusting the Color Balance*. If you create a new proof, make sure that the newly adjusted densities have been entered (as described in the previous section of this chapter), before printing.

2. Set up the Colorimeter

Set-up the X-Rite colorimeter as described in the X-Rite Operation Manual. The "store data" function must be activated and cleared of all previous measurements. Select the L.a.b measurement scale. Set illumin to D50/10 deg if you are using a viewing box with a color temperature of 5000 deg K or set D65/10 deg for 6500 deg K.

The following screen appears. Enter the new density values into the FEP:

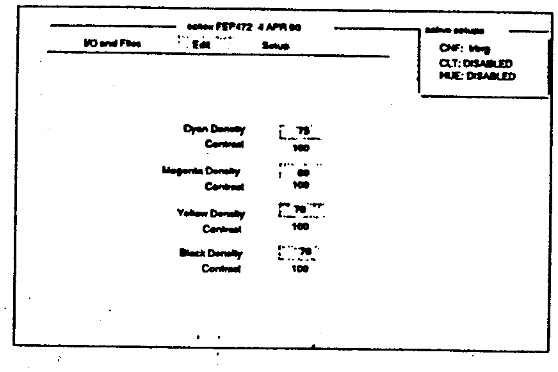

Make sure that the Contrast field remains set to 100.

3. Measure the Color Wedge Proof

The order in which you measure is imporant. Starting at 100% dot for Cyan, measure the luminance with the colorimeter. Now measure Magenta at 100% dot,Yellow at 100% dot and then Black at 100% dot. Continue measuring in this order at 5%dot intervals until you reach 0% dot (e.g. 95%, 90%, 85%, ...etc).

4. Download the Measurements

When all 84 points have been measured, you may now transfer the data to the Scitex workstation.

Connect the X-Rite colorimeter to the Whisper via the supplied cable. The cable connects to the socket on the SCD card. Verify that the X-Rite is set to Baud Rate 9600, RCI = ON, CR with no Line Feed, and X-On/X-Off enabled. (See "RS232 I/O Parameters" section of the X-Rite Operation Manual.)

Next, on the Whisper station, select Table, New Table and choose Colorimeter. The following screen is displayed:

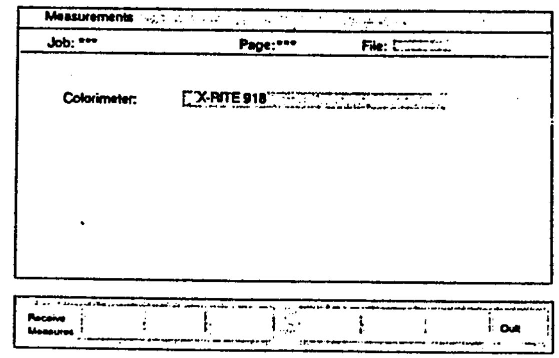

Type in a new name for the measurements file leaving the colorimeter field set to X-Rite 918. Press the Receive Measures softkey and the data transfer will take place. To monitor the progress, look at the X-Rite display.

5. Calculate the Excurve

On the Scitex workstation, select Table, New Table, then choose Auto LUT. The following screen appears:

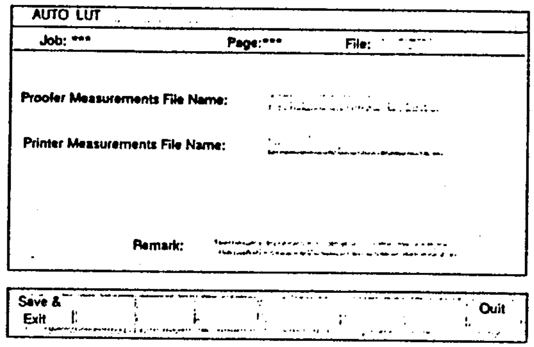

Enter the following parameters:

*file:* The new Excurve name (type LUT). This is the output of the function.

*Proof Measurements file:* The name of the measurements file downloaded (step 4.).

*Print Measurements file:* leave blank

Press Save & Exit softkey and the new Excurve will be calculated for Cyan, Magenta and Yellow.

The steps which follow are for the black separation of the Excurve.

6. Create a print of the Color Wedge on the target press system

Using the COLWDG.P file, create a print on the desired press system.

7. Measure the print

Starting at 100% dot, measure the luminance of black on the print. Write it down on the form provided on the next page. Continue to measure and note the luminance values at 5% dot intervals until you reach 0% dot.

8. Work with the Iris Proof

Begin by looking at the "Excurve Data Gathering" form and reading the luminance value that was previously measured from the print at 100% dot. Now start working on the Iris proof with the colorimeter. Locate this value (or closest value) on the last Iris Proof. Note the location on the %dot scale and enter it on the corresponding line of the form provided.

Repeat this for all the 21 luminances which have been measured on the print.

EXCURVE DATA GATHERING

BLACK

| % Dot | PRINT: Measured Luminance | PROOF: % dot of corresponding luminance |
|---|---|---|
| 100 % | | |
| 95 | | |
| 90 | | |
| 85 | | |
| 80 | | |
| 75 | | |
| 70 | | |
| 65 | | |
| 60 | | |
| 55 | | |
| 50 | | |
| 45 | | |
| 40 | | |
| 35 | | |
| 30 | | |
| 25 | | |
| 20 | | |
| 15 | | |
| 10 | | |
| 5 | | |
| 0 | | |
| | | |

Table Name__________ Date:__________ By:__________

Density (CMYB)__________ Drum Speed:__________ Paper Type_____

An Example:

In the example below, the luminance measured on the print at 95% dot for black was 14.67. On the Iris proof the luminance of 14.50 was found to be the closest. This occured at the 86% dot location on the scale. The form would be entered as shown below:

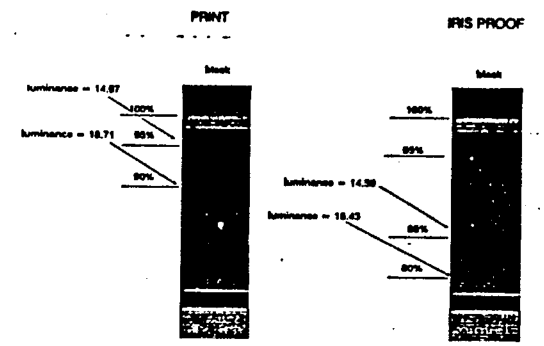

EXCURVE DATA GATHERING

| BLACK % Dot | PRINT: Measured Luminance | PROOF: % dot of corresponding luminance |
|---|---|---|
| 100 % | 14.00 | 100 |
| 95 | 14.67 | 86 |
| 90 | 18.71 | 79 |
| 85 | 25.89 | 75 |
| 80 | 30.88 | 78 |
| 75 | 36.21 | 72 |

9. Entering the Data for Black

To enter the data you have just determined for black, select the Excurve file (LUT file which you created in step 5) from the Library list. The following screen appears:

CREATE TABLE
JOB: | PAGE: | FILE: xyzlut

Modify Old File

Scanned File Scanner Values

| Save & Exit | Examine | List/ Modify | Abort |
|---|---|---|---|

Press the List/Modify softkey which brings you to a screen which typically, would look like this:

CREATE TABLE
JOB: | PAGE: | FILE: xyzlut
Modify List of Points

| # | On Scanned File C | M | Y | B | On Scanner C | M | Y | B |
|---|---|---|---|---|---|---|---|---|
| 1. | 100.0 | 100.0 | 100.0 | 100.0 | 56.9 | 50.5 | 86.5 | 14.0 |
| 2. | 95.0 | 95.0 | 95.0 | 95.0 | 58.8 | 52.7 | 88.8 | 14.8 |
| 3. | 90.0 | 90.0 | 90.0 | 90.0 | 60.7 | 54.9 | 88.1 | 18.7 |
| 4. | 85.0 | 85.0 | 85.0 | 85.0 | 62.5 | 57.1 | 88.4 | 25.8 |
| 5. | 80.0 | 80.0 | 80.0 | 80.0 | 64.4 | 58.3 | 88.7 | 30.8 |
| 6. | 75.0 | 75.0 | 75.0 | 75.0 | 66.3 | 61.5 | 90.0 | 36.2 |
| 7. | 70.0 | 70.0 | 70.0 | 70.0 | 68.2 | 63.7 | 90.4 | 40.3 |
| 8. | 65.0 | 65.0 | 65.0 | 65.0 | 70.1 | 65.8 | 90.8 | 44.3 |

| Exit | Add | Change | Delete | Continue |
|---|---|---|---|---|

You are also prompted to enter the new data. The values under "On Scanned File" should not be changed therefore skip over to the "On Scanner" column by pressing the ENTER key. Use the cursor (—>) key here to skip over to change the Black entry, leaving CMY as they appear. For black, enter the values that you filled in on the right-most column of the "Excurve Data Gathering" form ("Proof: %Dot of corresponding luminance"). The left-most column of the form ("%Dot") corresponds to the values of the "On Scanned File" entries on the screen.

To continue, press Another softkey and repeat the procedure until the black value for all 21 points have been modified. Once this is done, the Excurve is complete.

For each of the 21 points, a new value for black must be entered. To do this, press the Change softkey. This version of the screen appears:

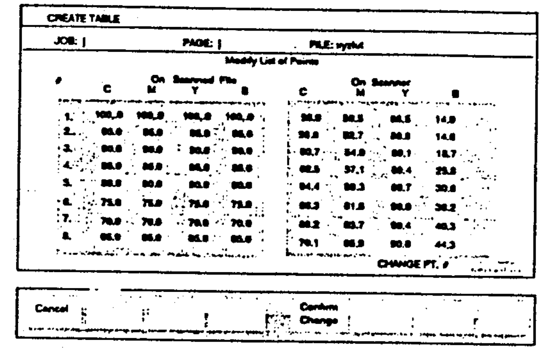

The system prompts you for the point number. The point number refers to the line # located under the "#" heading. After entering a line number, press the confinn change softkey. The values which currently exist for that line are displayed: .

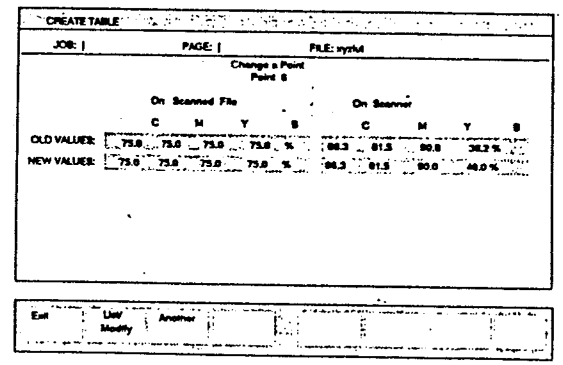

3.3 THE COLOR TRANSFORM

The Color Transform performs a color translation of a CT, LW or Final layout file, so that an Iris proof of this file will closely resemble the final press print.

Several Color Transforms have already been created at the factory to simulate some popular proofing and printing systems. These include: Matchprint, Cromalin, Offset, Gravure.... A magnetic tape containing the corresponding Color Transform files (type NDL) is supplied with every TRANS/4 system. Read this section to create a Color Transform for some other printing method.

Color Transforms are created by matching an Iris reference proof to a press reference proof (hereafter referred to as the "print"). The print is obtained by printing the color separations on the press with the same ink, paper and speed as would be used on the final job.

In this section, we will discuss ways to :

- Create a Color Transform
- Evaluate a Color Transform
- Edit a Color Transform
- Manipulate a Color Transform
- Apply a Color Transform to a Page

3.3.1 Creating a Custom Color Transform

The inputs to the Color Transform Function are:

- a set of colorimeter measurements taken from a sample pattern that was printed on the Iris printer (referred to as "proof").
- a set of colorimeter measurements taken from the same sample pattern that was printed on the desired press (referred to as "print").

The output of the Color Transform function is:

- a special Color Transform file (type NDL) which, when applied to a CT, LW or Final Layout, produces a color match of the prin:

CREATING A COLOR TRANSFORM

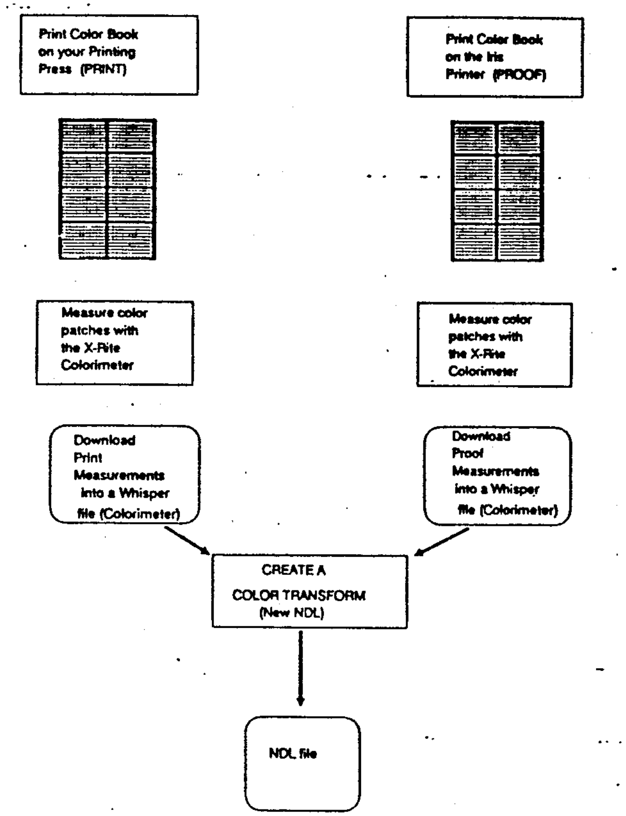

To create a Color Transform file, follow the steps below:

1. Create a Print and Proof

The first step is to create a proof of the sample COLOR BOOK pattern which has been supplied with TRANS/4. Output the COLBOOK.P file to the Iris Printer. (Refer to Chapter 1. for instructions on how to print files to the Iris Printer.) Next, create a print of COLBOOK.P by producing 4 color separations and duplicating the final printing process.

2. Set up the Colorimeter

Set-up the X-Rite colorimeter model 918. The "store data" feature must be activated and cleared of all previous measurements. Select the L.a.b. measurement scale. Set Illumin to D50/10 deg if you are using a viewing box with a color temperature of 5000 deg K or set D65/10 deg for 6500 deg K.

3. Measure the Print

The COLOR BOOK pattern consists of a grid of 8 boxes. Each box has a different constant value for yellow and contains 64 patches. Measure the C.I.E L*a*b* of each patch on the print with the colorimeter. Note that this will require 512 measurements. The order in which you measure the patches is very important. Proceed as follows:

COLBOOK.P

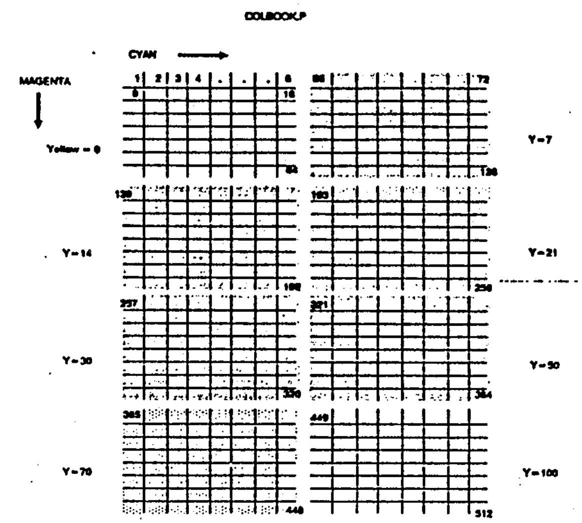

- First measure the white patch. This corresponds to patch #1 marked on the figure above.

- Continue measuring in the order in which the patches are numbered: 2, 3, 4, ...etc. Measure all 64 patches in the box and then proceed to measure the patches in the next box on the right (where Y = 7). Continue this until the darkest patch (#512) is measured. If at any point during the measuring, you need to stop, you can easily return to the point where you left off. Read in the last patch number read by the colorimeter by pressing the ILLUM and DIF keys simultaneiously on the X-Rite. The measurement number is displayed under the SEND DATA ? message. Select "No" for the queries which follow and then proceed to read the next patch. Refer to the figure on the next page to locate the position from which to continue measuring.

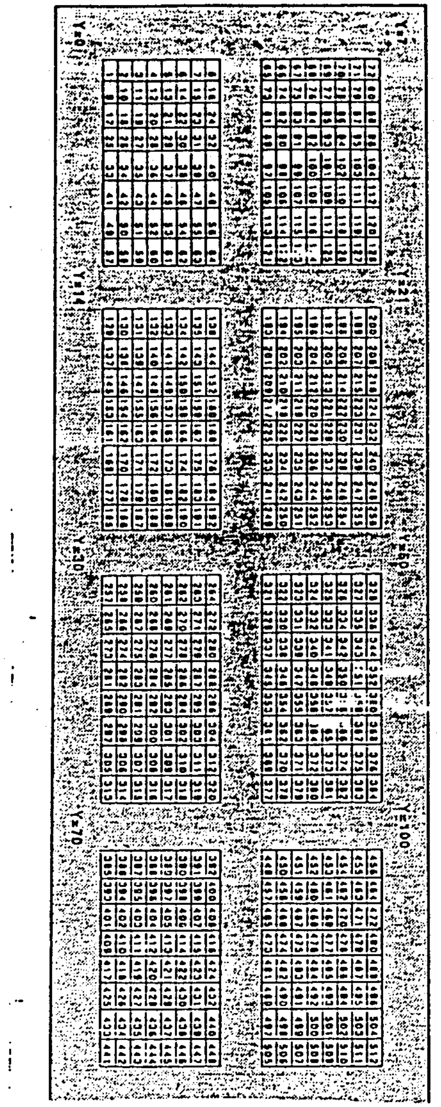

COORDINATES SCITEX TESTTABLE

4. Download Print Measurements From X-Rite To Whisper

When all 512 patches have been measured, you may now transfer the data to the Scitex workstation.

Connect the X-Rite colorimeter to the Whisper via the supplied cable. The cable connects to the socket on the SCD card. Verify that the X-Rite is set to Baud Rate 9600, RCI=ON, CR with no Line Feed and X-On/X-Off enabled. (Refer to "RS232 I/O Parameters" of the X-Rite Operations Manual.)

Next, on the Whisper, select Table, New Table and choose Colorimeter. The following screen appears.

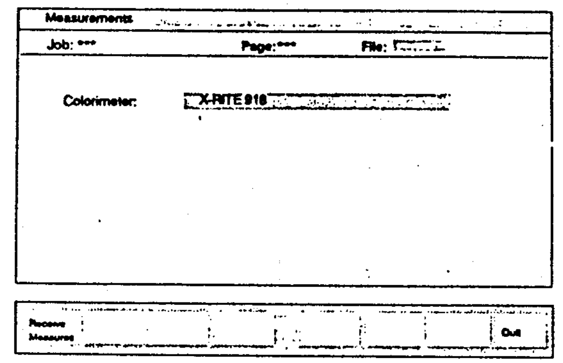

Type in a new name for the print measurements file leaving the colorimeter field set to X-Rite 918. Press the Receive Measures softkey and the data transfer will take place. To monitor the progress, look at the X-Rite display. There will be some delay and then the display will start flashing.

5. Measure the Proof

Repeat the same procedure for the proof as was described in Step 3."Measure the Print."

>> Note: When creating a Color Transform for a different printing method, Steps 5 and 6 need not be repeated since this data will not change.

6. Download Proof Measurements From X-Rite To Whisper

Download the proof data from the X-Rite to the Whisper exactly as was described in Step 4. for the print. Note, however, that the name you assign for the measurements file should be different.

7. Calculate the Color Transform

On the Scitex workstation, select Table, New Table, then choose New NDL. The following screen appears:

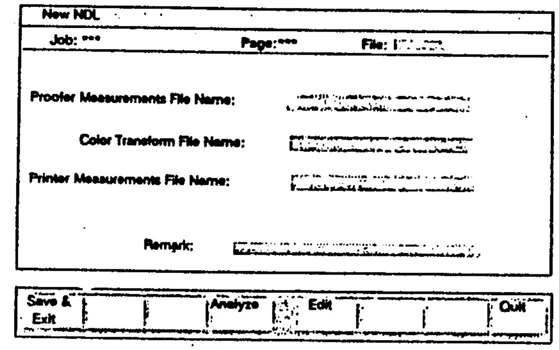

When calculating a particular Color Transform for the first time, enter the following parameters:

*File:* Enter a new Color Transform file name
*Color Transform file name*: LEAVE IT BLANK. (Used for Pass 2)
*Proof measurements file*: Enter the name as in step 4.
*Print measurements file*: Enter the name as in step 6.

Press the Save & Exit softkey to start the calculation.

Notice that the *Color Transform file* name has been left blank. This field is reserved for use when calculating the Color Transform on the 2nd Pass. The 2nd Pass calculation is optional and can be used to produce a Color Transform with possibly closer color match results. The procedure is outlined as follows:

PASS 1:

- Perform Steps 1 - 6 as described in the previous pages.
- Perform step 7. - Calculate the Color Transform - leaving the *Color Transform file* field blank.
- Press the Save & Exit softkey to perform the calculation

PASS 2 (optional):

- Create an Iris Proof of the Color Book, while applying the Color Transform file created in Pass 1 above.
- Measure this proof with the colorimeter (as described in step 5.).
- Download the proof measurements into a new proof measurements file ( as desribed in step 6).
- Calculate the new Color Transform (step 7) by specifying a new proof measurements file. Also, fill in the *Color Transform file* field with the NDL file name which was just created in Pass 1.
- Press the Save & Exit softkey to perform the 2nd Pass calculation.

In both passes, the Save & Exit softkey is pressed to initiate the calculation. To display the progress indicators, select show and then Bkgd status. It is then possible to observe the messages indicating the completion of the various stages of the calculation by noting the progress indicator bar graph. Three different bar graphs will appear during the procedure. If the Color Transform has been successfully created and no modifications necessary, then back up this Color Transform file onto magnetic tape.

To quit the calculation at any point, select Abort located under the bar graph.

3.3.2 Evaluating a Color Transform

After you have completed the Color Transform calculation, you can evaluate the results by applying the Color Transform to the Color Book CT and printing it on the Iris Printer once again. You can then inspect the proof visually or with the aid of a colorimeter.

An alternative approach is to let the TRANS/4 system analyze the results quantitatively. First, create a new proof with the Color Transform applied to the Color Book CT. Using the colorimeter, measure the 512 color patches and download them into a Proof measurements file. Select New NDL (see page 3-27) and fill in any bogus name for the file prompt. (Actually, no new file is created.) Enter the new Proof Measurements file name and the original Print Measurements file name. Pressing the Analyze softkey will display a special screen which gives you an idea of how close your "transformed" proof matches your print. A typical screen may appear as follows:

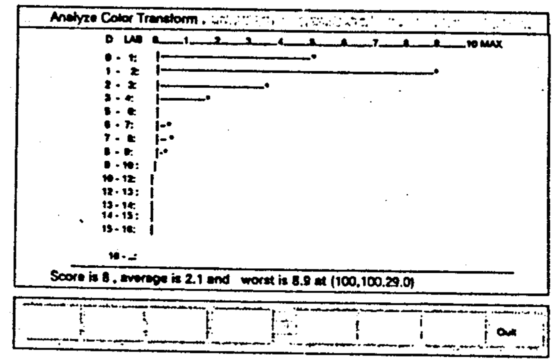

The units which appear under "D LAB" represent the "size" of the error. The 0 - 1 row represents the smallest possible error. The 1 - 2 row represents errors of a slightly greater magnitude, however they are still undetectable by the human eye. As you continue down the rows, these numbers increase and represent larger and larger errors. The dashed lines which appear next to the error scales represent the number of patches which were found to fall within that error range. Note that for display purposes, the maximum number of errors per error level has been normalized to 10 on this graph.

When most of the errors fall within the 0 - 1, 1 - 2, 2 - 3 or 3 - 4 range, the Color Transform that has been created is quite good. An overall average rating is given as well as the error of greatest magnitude which has been detected.

A large size error (anything greater than 7 - 8) will most likely be due to a bad colorimeter measurement or perhaps due to a non-printable color.

The system provides you with the actual CMYK position of the Color Book for the greatest error detected. This is in the event you wish to edit this particularly troublesome patch.

Once the closest measured position has been determined, the value of the Color Transform at that position is displayed alongside *Before Edit*. Now, key-in the new values alongside the *After Edit* position. Select *OK* when you are satisfied with your entries by pressing the ENTER key. If you wish to modify any of the keyed-in data, press the SPACE BAR to clear the *OK* and re-enter the data. How to edit points to obtain desired proofing results is a matter of experience as well as trial-and-error and beyond the scope of this manual.

You may continue to make further modifications. As the points are edited they are logged and displayed to the top portion of the screen. The left top portion shows the position of the CMYB point edited and the right top portion contains the values before (*old*) and after (*new*) editing.

When you have completed all modifications, make a back-up copy of the Color Transform file onto magnetic tape.

3.3.3 Editing a Color Transform

The <u>last</u> Color Transform created in the system may be edited. This might be done in order to adjust CMY points which have not been successfully transformed for one reason or another. (Note: Black may not be edited.) To access this function select New NDL (see page 3-27). Enter a new NDL file name leaving the other fields blank. Now, press the Edit softkey to begin editing.

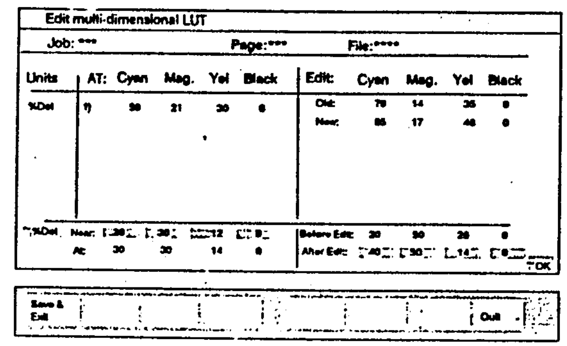

Start by specifying the units you are working with by toggling with the space bar between "% dot" or "system values". Next, enter the values for C,M,Y,B of the patch to be edited alongside *Near* located at the bottom left portion of the screen. *Note that only points which have been measured with the colorimeter may be edited.* When entering *Near:* values, the TRANS/4 system determines the closest location of the point actually measured and displays it alongside the *At* : row.

3.3.4 Manipulating the Color Transform

Once the Color Transform file (NDL) as been created, there are essentially three possible ways to manipulate it:

- Adding Black to an existing Color Transform
- Converting a Color Transform file to a CT
- Converting a CT back to a Color Transform file If any changes have been made to the original Color Transform, it is important to remember to back it up on magnetic tape.

Adding Black To An Existing Color Transform

Currently, when creating a Color Transform using the Color Book supplied, the value for black is not transformed. You may optionally add the black transform via the Add Black function. The Color Transform created when black is introduced is derived from the existing NDL file and not measured off a Color Book. .To bring up the screen, select Table, New Table and choose Add Black.

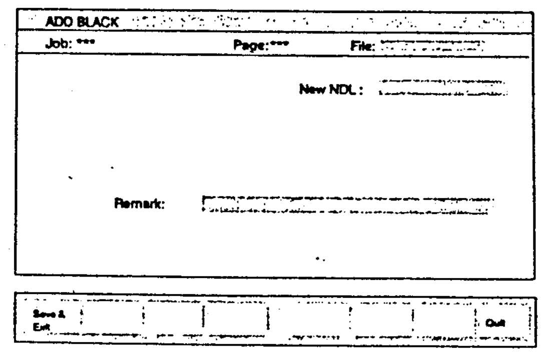

For the *file* field, enter the NDL file name which currently exists (without black). For the *New NDL* field, enter the name of the new Color Transform file which will now include different values of black.

Converting a Color Transform to a CT

The advantage to converting an NDL file to a CT file is that once you have a CT you can apply the data correction function that exists for CT's on the Scitex workstation. That is, you can apply a one-dimensional gradation onto the CT. For example, if you wanted to raise Cyan middletone by 5%, you would be able to accomplish this easily on the CT file. This is opposed to editing 512 points on the NDL Color Transform file.

After some change has been made to the CT file, it may be converted back to an NDL Color Transform file. To convert a Color Transform file to a CT, select Start work on an existing NDL file and the following appears:

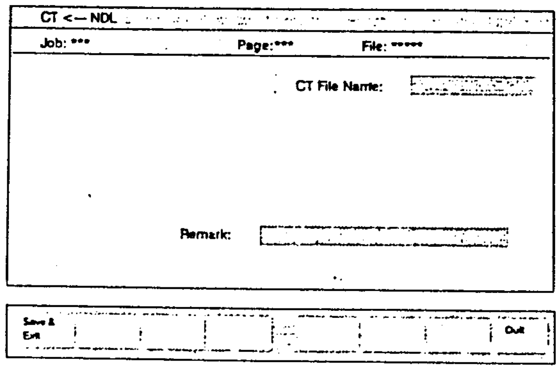

The NDL file name which was previously selected will be displayed.

For the *CT File Name* field, enter a new name.

Notes:

Be sure to use the Add Black function first if you wish to produce a black separation in the CT.

When creating a CT file, the %dot values which exist in the Color Transform file are compressed into a smaller range. Therefore, the correspondence between %dot values between NDL (actual) and CT (displayed) files is not one-to-one. The graph below may be used to convert the displayed %Dot values into actual %Dot values. For example, a displayed value of 20% dot has an actual % dot value of 15% dot in the NDL file.

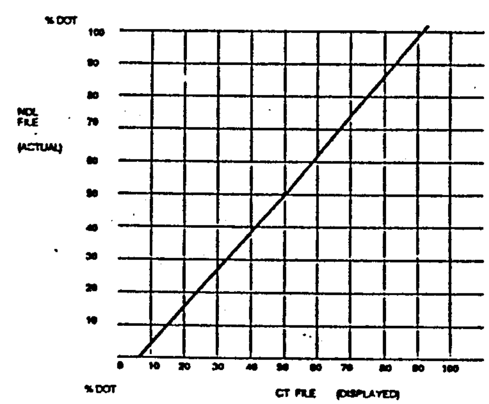

Converting a CT back to a Color Transform

If a Color Transform file has been converted to a CT and some editing has been done, the file must be brought back to its original form (NDL) in order to effect any changes on proofing.

Only files which have been *previously converted* to CT files, via the CT<— NDL function, may be brought back to the Color Transform format. Select Table, New Table and choo: › CT —> NDL to bring up this screen:

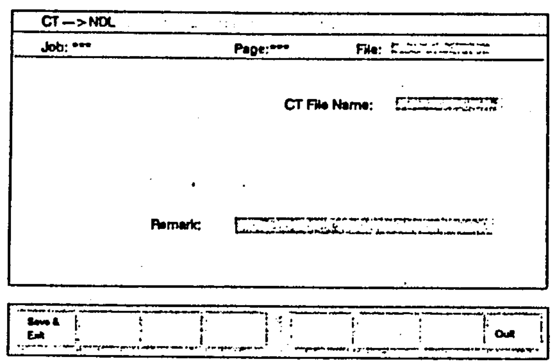

For the *File* field, enter a new Color Transform (NDL) file name. For the *CT File Name* field, enter the CT file you wish to convert.

Appendix I - HSP Installation Procedure

Introduction

The High Speed Processor (HSP) is a high speed co-processor for Whisper based Response systems. It functions as an accelerator for the Response CPU, increasing the speed and efficiency of the system. The HSP operates with all Whisper based Response and Micro-Response configurations.

The HSP Kit

The HSP (Catalog # 510K24087) is supplied as a kit containing the following:

| Items | Quantity | Catalog No. |
|---|---|---|
| HSP-A | 1 | 503D25747 |
| HSP-I | 1 | 503D26308 |
| PM2 (4 Mb) | 1 | 503D27365 |
| Jumper | 3 | 503B25748 |
| Manual | 1 | 399Z74725 |

3.3.5 Applying a Color Transform to a Page

Once the Color Transform has been set up and finalized it can be applied to a particular page for it to have its effect. Recall that your system can be calibrated to have any number of different Color Transforms which represent different printing environments.

To apply a Color Transform to a file, select the Proof Function. (This function is described in its entirety in Chapter 1. TRANS/4 Operation.) The inputs to Proof are the CT, LW or Final Layout file to be printed as well as the Excurve and Color Transform file you wish to apply to it. The output is a "transformed" image which is printed directly on the Iris printer.

HSP Hardware Installation

Before beginning the installation procedure, operate the system to verify that it is in working order.

*Note: The HSP can only be installed in systems operating on software version 4.2 and up.*

Perform the following to install the HSP kit in your Whisper based Response system.

1. Power-down the system.
2. Remove the Whisper cabinet front panel.
3. Verify that the DIP switches on the HSPI and PM2 boards are set as follows:

| Board | Location | Switch Setting |
|---|---|---|
| HSP-I | U102 | 1-7: ON; 8:OFF |
| PM2 | U1105 | 1:ON; 2-4: OFF |

4. Insert the HSPA, HSPI and PM2 boards into the slots appropriate for your Whisper based Response (see Table 1.) or Micro-Response (see Table 2).

*Note: In STARTER workstations, slot 2 must be free. If the MLT board is in slot 2, remove and insert in slot 9.*

| | IO, KEYLINE, ASSEMBLER, RIGHTOUCH, STARTER, SOFT/DTS | SOFT/DRUM | UNIFIED SYSTEMS ALL CONFIGURATIONS |
|---|---|---|---|
| PM2 | SLOT 2 | SLOT 15 | SLOT 6 |
| HSPI | SLOT 3 | SLOT 16 | SLOT 5 |
| HSPA | SLOT 4 | SLOT 17 | SLOT 4 |

Table 1. HSP Slot Assignments for Whisper based Systems

| | MICRO-ASSEMBLER | VIEWER | MICRO-WHISPER |
|---|---|---|---|
| PM2 | SLOT 9 | SLOT 8 | SLOT 5 |
| HSPI | SLOT 8 | SLOT 7 | SLOT 6 |
| HSPA | SLOT 7 | SLOT 6 | SLOT 7 |

Table 2. HSP Slot Assignments for Micro-Response Systems

5. Connect the jumper boards between the following HSP boards :
   - HSPA J1 and HSPI J1
   - HSPA J3 and HSPI J3
   - HSPI J2 and PM2 J2

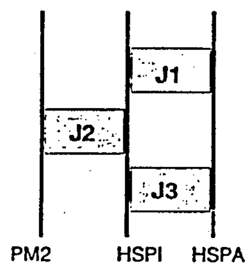

6. Replace the Whisper cabinet front panel.
7. Power-on the System.

HSP Testing

Test the HSP by performing the board tests through the on-line diagnostic handler and then test the HSP application by performing some Response operations.

HSP Board Diagnostics

Perform the following procedure to test the HSP and PM2 boards with the on-line diagnostic handler.

1. Invoke the diagnostic handler.
   - Select SERVICES from the utility menu on the Response.
   - Select DIAGNOSTICS from the Services Menu.

The startup screen is displayed on the terminal as shown below:

```
              SCITEX - DIAGNOSTICS SYSTEM (CPU X86)

                  VERSION X.X  MONTH  YEAR

Opt. Available:   TT - Tutorial    SC - Set config    VH - Version Highlight
                  UT - Utilities   O - Quit

Dev. Available:   W - WHISPER      U - UNIFIED        S - SMART_SCANNER
                     X - CSS_I       C - CSS_II         R - RAYSTAR
                     D - DOLEV       I - INTERFACE

                              Your Request:
```

HSP Software Configuration

In the configuration process we inform the system that the HSP boards have been installed. Perform the following from the Response application to configure the HSP boards in the system.

- Select SERVICES from the Utility menu.
- Select CONFIGURATION from the sub-menu.
- Select STATION CONFIG from this screen.
- Select BOARD CONFIG from this screen to display the following:

```
Board Configuration

        Functionality Enhancement

            PM1    [ No  ]
            PM2    [ Yes ]
            HSP    [ Yes ]

| Save & Exit |   | Enter | Main Menu |   |   | Quit |
```

Toggle the HSP and PM2 fields to display YES with the Space Bar.

Select SAVE & EXIT.

Reboot the system.

2. Test the HSPI and HSPA boards
   - Enter U (CR) for UNIFIED
   - Enter (CR) for CHECK CONFIG.

The Unified subsystems that can be tested are displayed as shown in the figure below:

*Note: Response systems have different configurations. This menu will vary depending on the configuration.*

```
SYSTEM  UTILITIES   UNIFIED DIAGNOSTICS    v.x  MONTH-YR
  ?? Help    CD Change Device     Q Quit
  F  Flags   $ Status    E Errors    M Modes
Trace >                                  Modes > Execute
PREVIOUS SELECTION | TEST TREE                | HELP
                   | 1. CPU - 386             |
                   | 2. PDU - confS           |
                   | 3. VIDEO PROCESS         |
                   | 4. FRAME BUFFER          |
                   | 5. HSPM - 2              |
                   | 6. MONITOR               |
                   | H: home     B: back      |
Prompt >
```

- Select HSPM-2 from this menu (enter 5 (CR) to get:

```
SYSTEM  UTILITIES   UNIFIED DIAGNOSTICS    v.x  MONTH-YR
  ?? Help    CD Change Device     Q Quit
  F  Flags   $ Status    E Errors    M Modes
Trace >                                  Modes > Execute
PREVIOUS SELECTION   | TEST TREE            | HELP
  1. CPU - 386       |  1. WLDC             |
  2. PDU - confS     |  2. SEQUENCER        |
  3. VIDEO PROCESS   |  3. WCS              |
  4. FRAME BUFFER    |  4. ALU'S            |
  5. HSPM - 2        |  5. OPR              |
  6. MONITOR         |  6. BARREL SHFTR     |
                     |  7. MPY AND FR       |
                     |  8. SP MEM           |
                     |  9. MAP @ SH MEM     |
                     |  10. PARALLEL EXE    |
                     |  H: home    B: back  |
Prompt >
```

- Enter // (CR) to run all the test in a batch.

3. Test the PM2 board
   - Enter B to go back to the Unified subsystems menu
   - Select FRAME BUFFER from this menu.
   - Select PICTURE MEM from the Frame Buffer menu
   - Select PM2
   - Enter // (CR) to run all the tests in a batch.

4. Quit the Diagnostic Handler by entering Q (CR). The system exits the diagnostic mode and reboots.

Application Tests

Create a LW and make sure that the process ends successfully.
Rotate a CT and make sure that the process ends successfully.

APPENDIX - F

MAX+PLUS Compiler Report File
Version 2.50 05/31/90

***** Design compiled without errors

Title: LW_BUFFER
Company: Scitex
Designer: ELI KATZIR
Rev: A
Date: 8:51a 11-13-1990
Turbo: ON
Security: OFF

```
                                       D                                   L
                D   D   D   D   D   S                       R           W               R
                S   S   S   S   S   P       Z       R       A           _               A
                P   P   P   P   P   _       E   C   A       D           H       R       D
                                    A   V   R   L   D   G   R   W       P   T   A       R
                D   D   D   D   D   1   C   O   K   R   N   1   E       T   R   S       1
                4   3   2   1   0   8   C   1   1   9   D   0   N       Y   G   _       7
              ----------------------------------------------------------------------------
            /   9   8   7   6   5   4   3   2   1  68  67  66  65  64  63  62  61  
   DSP_D5  | 10                                                               60 | LW_IRDY
   DSP_D6  | 11                                                               59 | LW_ORDY
   DSP_TA_ | 12                                                               58 | CAS_
      ATE  | 13                                                               57 | VADR8
    RADR3  | 14                                                               56 | VADR7
    RADR4  | 15                                                               55 | TEST
      GND  | 16                                                               54 | VCC
   V_SCLK  | 17                                                               53 | V_SE
 RESERVED  | 18                          EPM5128-2                            52 | REF_ON_
 RESERVED  | 19                                                               51 | RADR16
      VCC  | 20                                                               50 | GND
 RESERVED  | 21                                                               49 | RADR15
    RADR6  | 22                                                               48 | RADR14
    RADR7  | 23                                                               47 | RADR8
   DSP_D7  | 24                                                               46 | RESERVED
   DSP_RW  | 25                                                               45 | VADR6
   DSP_TS  | 26                                                               44 | VADR5
           |_  27  28  29  30  31  32  33  34  35  36  37  38  39  40  41  42  43  _|
              ----------------------------------------------------------------------------
               H   L   R   R   R   R   G   R   R   R   V   R   V   V   V   V   V
               O   O   A   A   A   S   N   A   A   A   C   A   A   A   A   A   A
               S   A   D   D   D   T   D   D   D   D   C   D   D   D   D   D   D
               T   D   R   R   R   1       R   R   R       R   R   R   R   R   R
               _   1   0   1   2           1   1   1       5   0   1   2   3   4
               S                           3   2   1
               I
```

| Logic Array Block | | Macrocells | I/O Pins | Expanders | External Interconnect |
|---|---|---|---|---|---|
| A: | MC1 - MC16 | 1/16( 6%) | 8/ 8(100%) | 1/32( 3%) | 10/24( 41%) |
| B: | MC17 - MC32 | 16/16(100%) | 5/ 5(100%) | 0/32( 0%) | 13/24( 54%) |
| C: | MC33 - MC48 | 16/16(100%) | 2/ 5( 40%) | 19/32( 59%) | 21/24( 87%) |
| D: | MC49 - MC64 | 14/16( 87%) | 8/ 8(100%) | 3/32( 9%) | 23/24( 95%) |
| E: | MC65 - MC80 | 16/16(100%) | 8/ 8(100%) | 1/32( 3%) | 24/24(100%) |
| F: | MC81 - MC96 | 15/16( 93%) | 4/ 5( 80%) | 17/32( 53%) | 14/24( 58%) |
| G: | MC97 - MC112 | 13/16( 81%) | 5/ 5(100%) | 0/32( 0%) | 15/24( 62%) |
| H: | MC113 - MC128 | 9/16( 56%) | 8/ 8(100%) | 31/32( 96%) | 21/24( 87%) |

Total dedicated input pins used: 8/ 8 (100%)
Total I/O pins used: 48/ 52 ( 92%)

```
Total macrocells used:              100/128 ( 78%)
Total expanders used:                72/256 ( 28%)

Total input pins required:           36
Total output pins required:          20
Total bidirectional pins required:    0
Total macrocells required:          100
Total expanders in database:         69

Synthesized macrocells:               0/128 (  0%)

|74240:593|
|74273:458|
|74273:457|
|7474:421|
|7474:417|
|7474:360|
|7474:581|
|7474:233|
|7474:217|
|7474:507|
|7474:516|
|7474:537|
|7474:508|
|7474:384|
|LWSEQ:557|
|7476:598|
|74161:46|
|COMP:416|
|74164:551|
|8COUNT:231|
|8COUNT:122|
|8COUNT:119|
|8COUNT:395|
|8COUNT:578|
|74253:587|
|74253:588|
|74253:589|
|74253:590|
|74253:591|
|74244:592|
```

| Pin | MCell | LAB | Primitive | Expanders Total | Expanders Shared | Fan-In INP | Fan-In FBK | Name |
|---|---|---|---|---|---|---|---|---|
| 13 | (18) | (B) | INPUT | 0 | 0 | 0 | 0 | ATE |
| 1 | - | - | INPUT | 0 | 0 | 0 | 0 | CLK1 |
| 4 | (1) | (A) | INPUT | 0 | 0 | 0 | 0 | DSP_A18 |
| 5 | (2) | (A) | INPUT | 0 | 0 | 0 | 0 | DSP_D0 |
| 6 | (3) | (A) | INPUT | 0 | 0 | 0 | 0 | DSP_D1 |
| 7 | (4) | (A) | INPUT | 0 | 0 | 0 | 0 | DSP_D2 |
| 8 | (5) | (A) | INPUT | 0 | 0 | 0 | 0 | DSP_D3 |
| 9 | (6) | (A) | INPUT | 0 | 0 | 0 | 0 | DSP_D4 |
| 10 | (7) | (A) | INPUT | 0 | 0 | 0 | 0 | DSP_D5 |
| 11 | (8) | (A) | INPUT | 0 | 0 | 0 | 0 | DSP_D6 |
| 24 | (49) | (D) | INPUT | 0 | 0 | 0 | 0 | DSP_D7 |
| 25 | (50) | (D) | INPUT | 0 | 0 | 0 | 0 | DSP_RW |
| 26 | (51) | (D) | INPUT | 0 | 0 | 0 | 0 | DSP_TS |
| 27 | (52) | (D) | INPUT | 0 | 0 | 0 | 0 | HOST_SI |
| 28 | (53) | (D) | INPUT | 0 | 0 | 0 | 0 | LOAD1 |
| 29 | (54) | (D) | INPUT | 0 | 0 | 0 | 0 | RADR0 |
| 30 | (55) | (D) | INPUT | 0 | 0 | 0 | 0 | RADR1 |
| 31 | (56) | (D) | INPUT | 0 | 0 | 0 | 0 | RADR2 |
| 14 | (19) | (B) | INPUT | 0 | 0 | 0 | 0 | RADR3 |
| 15 | (20) | (B) | INPUT | 0 | 0 | 0 | 0 | RADR4 |
| 38 | (65) | (E) | INPUT | 0 | 0 | 0 | 0 | RADR5 |
| 22 | (36) | (C) | INPUT | 0 | 0 | 0 | 0 | RADR6 |
| 23 | (37) | (C) | INPUT | 0 | 0 | 0 | 0 | RADR7 |

| | | | | | | | | |
|---|---|---|---|---|---|---|---|---|
| 47 | (82) | (F) | INPUT | 0 | 0 | 0 | 0 | RADR8 |
| 68 | - | - | INPUT | 0 | 0 | 0 | 0 | RADR9 |
| 66 | - | - | INPUT | 0 | 0 | 0 | 0 | RADR10 |
| 36 | - | - | INPUT | 0 | 0 | 0 | 0 | RADR11 |
| 35 | - | - | INPUT | 0 | 0 | 0 | 0 | RADR12 |
| 34 | - | - | INPUT | 0 | 0 | 0 | 0 | RADR13 |
| 48 | (83) | (F) | INPUT | 0 | 0 | 0 | 0 | RADR14 |
| 49 | (84) | (F) | INPUT | 0 | 0 | 0 | 0 | RADR15 |
| 51 | (85) | (F) | INPUT | 0 | 0 | 0 | 0 | RADR16 |
| 61 | (116) | (H) | INPUT | 0 | 0 | 0 | 0 | RADR17 |
| 32 | - | - | INPUT | 0 | 0 | 0 | 0 | RST1 |
| 55 | (99) | (G) | INPUT | 0 | 0 | 0 | 0 | TEST |
| 2 | - | - | INPUT | 0 | 0 | 0 | 0 | ZERO1 |

| | | | | Expanders | | Fan-In | | |
|---|---|---|---|---|---|---|---|---|
| Pin | MCell | LAB | Primitive | Total | Shared | INP | FBK | Name |
| 58 | 113 | H | DFF+ | 2 | 1 | 3 | 6 | CAS_ |
| 12 | 17 | B | NOR2 | 0 | 0 | 1 | 4 | DSP_TA |
| 64 | 119 | H | DFF+ | 0 | 0 | 2 | 10 | LW_HPTY |
| 60 | 115 | H | DFF+ | 0 | 0 | 2 | 11 | LW_IRDY |
| 59 | 114 | H | NOT | 0 | 0 | 1 | 9 | LW_ORDY |
| 62 | 117 | H | DFF+ | 14 | 1 | 3 | 23 | RAS_ |
| 52 | 97 | G | NOT | 0 | 0 | 1 | 9 | REF_ON_ |
| 63 | 118 | H | DFF+ | 15 | 0 | 3 | 23 | TRG_ |
| 39 | 66 | E | OR4 | 0 | 0 | 3 | 4 | VADR0 |
| 40 | 67 | E | OR4 | 0 | 0 | 3 | 4 | VADR1 |
| 41 | 68 | E | OR4 | 0 | 0 | 3 | 4 | VADR2 |
| 42 | 69 | E | OR4 | 0 | 0 | 3 | 4 | VADR3 |
| 43 | 70 | E | OR4 | 0 | 0 | 3 | 4 | VADR4 |
| 44 | 71 | E | OR4 | 0 | 0 | 3 | 4 | VADR5 |
| 45 | 72 | E | OR4 | 0 | 0 | 3 | 4 | VADR6 |
| 56 | 100 | G | OR4 | 0 | 0 | 3 | 4 | VADR7 |
| 57 | 101 | G | OR4 | 0 | 0 | 3 | 4 | VADR8 |
| 17 | 21 | B | OR2 | 0 | 0 | 1 | 4 | V_SCLK |
| 53 | 98 | G | NOT | 0 | 0 | 5 | 0 | V_SE |
| 65 | 120 | H | DFF+ | 0 | 0 | 3 | 6 | WEN |

| | | | | Expanders | | Fan-In | | |
|---|---|---|---|---|---|---|---|---|
| Pin | MCell | LAB | Primitive | Total | Shared | INP | FBK | Name |
| - | 48 | C | SOFT | 18 | 0 | 9 | 9 | \|COMP:416\|NEQ |
| - | 96 | F | MCELL | 0 | 0 | 0 | 1 | INIT_ |
| - | 95 | F | SOFT | 0 | 0 | 0 | 4 | \|LWSEQ:557\|REFOFF |
| - | 94 | F | DFF+ | 0 | 0 | 2 | 7 | \|LWSEQ:557\|~22~ |
| - | 93 | F | DFF+ | 0 | 0 | 2 | 6 | \|LWSEQ:557\|~23~ |
| - | 92 | F | DFF+ | 17 | 2 | 2 | 23 | \|LWSEQ:557\|~27~ |
| - | 64 | D | MCELL | 0 | 0 | 0 | 2 | WCRY0 |
| - | 80 | E | MCELL | 0 | 0 | 0 | 9 | WCRY1 |
| - | 47 | C | DFF | 1 | 1 | 1 | 4 | \|8COUNT:119\|QA |
| - | 79 | E | DFF | 1 | 1 | 1 | 5 | \|8COUNT:119\|QB |
| - | 78 | E | DFF | 1 | 1 | 1 | 6 | \|8COUNT:119\|QC |
| - | 77 | E | DFF | 1 | 1 | 1 | 7 | \|8COUNT:119\|QD |
| - | 76 | E | DFF | 1 | 1 | 1 | 8 | \|8COUNT:119\|QE |
| - | 75 | E | DFF | 1 | 1 | 1 | 9 | \|8COUNT:119\|QF |
| - | 74 | E | DFF | 1 | 1 | 1 | 10 | \|8COUNT:119\|QG |
| - | 73 | E | DFF | 1 | 1 | 1 | 11 | \|8COUNT:119\|QH |
| - | 46 | C | DFF | 0 | 0 | 1 | 4 | \|8COUNT:122\|QA |
| (38) | 65 | E | DFF | 0 | 0 | 1 | 5 | \|8COUNT:122\|QB |
| - | 45 | C | DFF | 0 | 0 | 1 | 6 | \|8COUNT:122\|QC |
| - | 44 | C | DFF | 0 | 0 | 1 | 7 | \|8COUNT:122\|QD |
| - | 43 | C | DFF | 0 | 0 | 1 | 8 | \|8COUNT:122\|QE |
| - | 42 | C | DFF | 0 | 0 | 1 | 9 | \|8COUNT:122\|QF |
| - | 41 | C | DFF | 0 | 0 | 1 | 10 | \|8COUNT:122\|QG |
| - | 40 | C | DFF | 0 | 0 | 1 | 11 | \|8COUNT:122\|QH |
| - | 91 | F | DFF+ | 0 | 0 | 1 | 3 | \|8COUNT:231\|QA |

| | | | | | | | | | |
|---|---|---|---|---|---|---|---|---|---|
| - | 90 | F | DFF+ | 0 | 0 | 1 | 4 | 8COUNT: 231 | QB |
| - | 89 | F | DFF+ | 0 | C | 1 | 5 | 8COUNT: 231 | QC |
| - | 88 | F | DFF+ | 0 | 0 | 1 | 6 | 8COUNT: 231 | QD |
| - | 87 | F | DFF+ | 0 | 0 | 1 | 7 | 8COUNT: 231 | QE |
| - | 86 | F | DFF+ | 0 | 0 | 1 | 8 | 8COUNT: 231 | QF |
| (51) | 85 | F | DFF+ | 0 | 0 | 1 | 9 | 8COUNT: 231 | QG |
| - | 32 | B | DFF+ | 0 | 0 | 2 | 3 | 8COUNT: 395 | QA |
| - | 31 | B | DFF+ | 0 | 0 | 2 | 4 | 8COUNT: 395 | QB |
| - | 30 | B | DFF+ | 0 | 0 | 2 | 5 | 8COUNT: 395 | QC |
| - | 29 | B | DFF+ | 0 | 0 | 2 | 6 | 8COUNT: 395 | QD |
| - | 28 | B | DFF+ | 0 | 0 | 2 | 7 | 8COUNT: 395 | QE |
| - | 27 | B | DFF+ | 0 | 0 | 2 | 8 | 8COUNT: 395 | QF |
| - | 26 | B | DFF+ | 0 | 0 | 2 | 9 | 8COUNT: 395 | QG |
| - | 25 | B | DFF+ | 0 | 0 | 2 | 10 | 8COUNT: 395 | QH |
| - | 112 | G | DFF+ | 0 | 0 | 1 | 1 | 8COUNT: 578 | QA |
| - | 111 | G | DFF+ | 0 | 0 | 1 | 2 | 8COUNT: 578 | QB |
| - | 110 | G | DFF+ | 0 | 0 | 1 | 3 | 8COUNT: 578 | QC |
| - | 109 | G | DFF+ | 0 | 0 | 1 | 4 | 8COUNT: 578 | QD |
| - | 108 | G | DFF+ | 0 | 0 | 1 | 5 | 8COUNT: 578 | QE |
| - | 107 | G | DFF+ | 0 | 0 | 1 | 6 | 8COUNT: 578 | QF |
| - | 106 | G | DFF+ | 0 | 0 | 1 | 7 | 8COUNT: 578 | QG |
| - | 105 | G | DFF+ | 0 | 0 | 1 | 8 | 8COUNT: 578 | QH |
| - | 63 | D | MCELL | 0 | 0 | 0 | 1 | : 496 | |
| - | 62 | D | DFF | 0 | 0 | 1 | 5 | 7474: 217 | 1Q |
| (48) | 83 | F | DFF+ | 0 | 0 | 1 | 1 | 7474: 233 | 1Q |
| - | 24 | B | DFF+ | 0 | 0 | 1 | 2 | 7474: 233 | 2Q |
| - | 61 | D | DFF | 0 | 0 | 1 | 2 | 7474: 360 | 1Q |
| - | 128 | H | DFF+ | 0 | 0 | 1 | 3 | 7474: 360 | 2Q |
| - | 60 | D | DFF | 1 | 1 | 4 | 4 | 7474: 417 | 1Q |
| (47) | 82 | F | DFF+ | 0 | 0 | 1 | 10 | 7474: 417 | 2Q |
| - | 39 | C | DFF | 0 | 0 | 1 | 11 | 7474: 421 | 1Q |
| (46) | 81 | F | DFF+ | 0 | 0 | 2 | 0 | 7474: 421 | 2Q |
| - | 59 | D | DFF | 0 | 0 | 0 | 2 | 7474: 507 | 1Q |
| - | 58 | D | DFF | 2 | 1 | 4 | 11 | 7474: 508 | 1Q |
| - | 127 | H | DFF+ | 0 | 0 | 1 | 1 | 7474: 508 | 2Q |
| - | 57 | D | DFF | 2 | 1 | 4 | 6 | 7474: 516 | 1Q |
| - | 23 | B | DFF+ | 0 | 0 | 1 | 1 | 7474: 516 | 2Q |
| - | 22 | B | DFF+ | 0 | 0 | 1 | 1 | 7474: 537 | 1Q |
| - | 16 | A | DFF | 1 | 0 | 0 | 10 | 7474: 581 | 1Q |
| - | 104 | G | DFF+ | 0 | 0 | 1 | 8 | 7474: 581 | 2Q |
| (31) | 56 | D | DFF | 0 | 0 | 1 | 2 | 7476: 598 | 1Q |
| (30) | 55 | D | DFF | 0 | 0 | 1 | 3 | 74161: 46 | QA |
| (29) | 54 | D | DFF | 0 | 0 | 1 | 4 | 74161: 46 | QB |
| (15) | 20 | B | DFF+ | 0 | 0 | 1 | 1 | 74164: 551 | QA |
| (14) | 19 | B | DFF+ | 0 | 0 | 1 | 1 | 74164: 551 | QB |
| (13) | 18 | B | DFF+ | 0 | 0 | 1 | 1 | 74164: 551 | QC |
| (28) | 53 | D | DFF | 0 | 0 | 1 | 2 | 74273: 457 | : 12 |
| - | 38 | C | DFF | 0 | 0 | 1 | 2 | 74273: 458 | : 12 |
| (23) | 37 | C | DFF | 0 | 0 | 1 | 2 | 74273: 458 | : 13 |
| (22) | 36 | C | DFF | 0 | 0 | 1 | 2 | 74273: 458 | : 14 |
| (18) | 33 | C | DFF | 0 | 0 | 1 | 2 | 74273: 458 | : 15 |
| (27) | 52 | D | DFF | 0 | 0 | 1 | 2 | 74273: 458 | : 16 |
| (26) | 51 | D | DFF | 0 | 0 | 1 | 2 | 74273: 458 | : 17 |
| (19) | 34 | C | DFF | 0 | 0 | 1 | 2 | 74273: 458 | : 18 |
| (21) | 35 | C | DFF | 0 | 0 | 1 | 2 | 74273: 458 | : 19 |

Logic Array Block "A":

```
         M
         C
         1
         6
         | | A B C D E F G H | Name
MC16 -> - | @ - - - - * - * | |7474:581|1Q

@1   -> - | - * - - - - * * * | CLK1
@68  -> - | - - * * * - - - - | RADR9
```

```
@66   -> - | - - * - * - - - | RADR10
@36   -> - | - - * - * - - - | RADR11
@35   -> - | - - * * * - - - | RADR12
@34   -> - | - - * * * - - - | RADR13
@32   -> - | - - - - - * - * | RST1
@2    -> - | - - * * * - - - | ZERO1
MC95 -> * | * - - - - @ - - | |LWSEQ: 557|ncrOFF
MC112-> * | * - - - - - @ - | |8COUNT: 578|QA
MC111-> * | * - - - - - @ - | |8COUNT: 578|QB
MC110-> * | * - - - - - @ - | |8COUNT: 578|QC
MC109-> * | * - - - - - @ - | |8COUNT: 578|QD
MC108-> * | * - - - - - @ - | |8COUNT: 578|QE
MC107-> * | * - - - - - @ - | |8COUNT: 578|QF
MC106-> * | * - - - - - @ - | |8COUNT: 578|QG
MC105-> * | * - - - - - @ - | |8COUNT: 578|QH
MC104-> * | * - - - - - @ - | |7474: 581|2Q
```

Logic Array Block "B":

```
         M M M M M M M M M M M M M M M M
         C C C C C C C C C C C C C C C C
         1 2 3 3 3 2 2 2 2 2 2 2 2 2 1 1
         7 1 2 1 0 9 8 7 6 5 4 3 2 0 9 8
         | | | | | | | | | | | | | | | |   | A B C D E F G H | Name
MC17  -> - - - - - - - - - - - - - - - -   | - @ - - - - - - | DSP_TA_
MC21  -> - - - - - - - - - - - - - - - -   | - @ - - - - - - | V_SCLK
MC32  -> - - * * * * * * * * - - - - - -   | - @ - * - - - - | |8COUNT: 395|QA
MC31  -> - - - * * * * * * * - - - - - -   | - @ - * - - - - | |8COUNT: 395|QB
MC30  -> - - - - * * * * * * - - - - - -   | - @ - * - - - - | |8COUNT: 395|QC
MC29  -> - - - - - * * * * * - - - - - -   | - @ - * - - - - | |8COUNT: 395|QD
MC28  -> - - - - - - * * * * - - - - - -   | - @ - * - - - - | |8COUNT: 395|QE
MC27  -> - - - - - - - * * * - - - - - -   | - @ - * - - - - | |8COUNT: 395|QF
MC26  -> - - - - - - - - * * - - - - - -   | - @ - * - - - - | |8COUNT: 395|QG
MC25  -> - - - - - - - - - * - - - - - -   | - @ - * - - - - | |8COUNT: 395|QH
MC24  -> - - - - - - - - - - - - - - - -   | - @ - - - * - * | |7474: 233|2Q
MC23  -> * * - - - - - - - - - - * - - -   | - @ - * - - - - | |7474: 516|2Q
MC22  -> * * - - - - - - - - - - - - - -   | - @ - - - - - - | |7474: 537|1Q
MC20  -> * - * * * * * * * * - - - - * -   | - @ - * - - - - | |74164: 551|QA
MC19  -> * - - - - - - - - - - - - - - *   | - @ - - - - - - | |74164: 551|QB
MC18  -> - - - - - - - - - - * - - - - -   | - @ - - - - - - | |74164: 551|QC

@13   -> * * - - - - - - - - - - - - - -   | - @ - - * - * * | ATE
@1    -> - - * * * * * * * * * * * * * *   | - * - - - * * * | CLK1
@5    -> - - * - - - - - - - - - - - - -   | @ * - - - - - - | DSP_D0
@6    -> - - - * - - - - - - - - - - - -   | @ * - - - - - - | DSP_D1
@7    -> - - - - * - - - - - - - - - - -   | @ * - - - - - - | DSP_D2
@8    -> - - - - - * - - - - - - - - - -   | @ * - - - - - - | DSP_D3
@9    -> - - - - - - * - - - - - - - - -   | @ * - - - - - - | DSP_D4
@10   -> - - - - - - - * - - - - - - - -   | @ * - - - - - - | DSP_D5
@11   -> - - - - - - - - * - - - - - - -   | @ * - - - - - - | DSP_D6
@24   -> - - - - - - - - - * - - - - - -   | - * - @ - - - - | DSP_D7
@68   -> - - - - - - - - - - - - - - - -   | - - * * * - - - | RADR9
@66   -> - - - - - - - - - - - - - - - -   | - - * - * - - - | RADR10
@36   -> - - - - - - - - - - - - - - - -   | - - * - * - - - | RADR11
@35   -> - - - - - - - - - - - - - - - -   | - - * * * - - - | RADR12
@34   -> - - - - - - - - - - - - - - - -   | - - * * * - - - | RADR13
@32   -> - - - - - - - - - - - - - - - -   | - - - - - * - * | RST1
@2    -> - - - - - - - - - - - - - - - -   | - - * * * - - - | ZERO1
MC96  -> - * * * * * * * * * - - - - - -   | - * * * * @ - * | INIT
MC94  -> - * - - - - - - - - - - - - - -   | - * * * * @ - * | |LWSEQ: 557|~22~
MC127-> - - * * * * * * * * * - - * - -   | - * - * - - - @ | |7474: 508|2Q
MC57  -> - - - - - - - - - - - * - - - -   | - * - @ - - - - | |7474: 516|1Q
```

Logic Array Block "C":

```
        M M M M M M M M M M M M M M M M
        C C C C C C C C C C C C C C C C
        4 4 4 4 4 4 4 4 4 3 3 3 3 3 3 3
        8 7 6 5 4 3 2 1 0 9 8 7 6 3 4 5
        | | | | | | | | | | | | | | | |  | A B C D E F G H | Name
MC48 -> - - - - - - - - - - - - - - - -  | - - @ * - - - - | |COMP: 416|NEQ
MC47 -> - * - - - - - - - * - - - - - -  | - - @ - * - - - | |8COUNT: 119|QA
MC46 -> - - * * * * * * * - - - - - - -  | - - @ - * - - - | |8COUNT: 122|QA
MC45 -> - - - * * * * * * - - - - - - -  | - - @ - * - - - | |8COUNT: 122|QC
MC44 -> - - - - * * * * * - - - - - - -  | - - @ - * - - - | |8COUNT: 122|QD
MC43 -> - - - - - * * * * - - - - - - -  | - - @ - * - - - | |8COUNT: 122|QE
MC42 -> - - - - - - * * * - - - - - - -  | - - @ - * - - - | |8COUNT: 122|QF
MC41 -> - - - - - - - * * - - - - - - -  | - - @ - - - * - | |8COUNT: 122|QG
MC40 -> - - - - - - - - * - - - - - - -  | - - @ - - - * - | |8COUNT: 122|QH
MC39 -> - - - - - - - - - - - - - - - -  | - - @ - - * - * | |7474: 421|1Q
MC38 -> * - - - - - - - - - - - - - - -  | - - @ - - - - - | |74273: 458|: 12
MC37 -> * - - - - - - - - - - - - - - -  | - - @ - - - - - | |74273: 458|: 13
MC36 -> * - - - - - - - - - - - - - - -  | - - @ - - - - - | |74273: 458|: 14
MC33 -> * - - - - - - - - - - - - - - -  | - - @ - - - - - | |74273: 458|: 15
MC34 -> * - - - - - - - - - - - - - - -  | - - @ - - - - - | |74273: 458|: 18
MC35 -> * - - - - - - - - - - - - - - -  | - - @ - - - - - | |74273: 458|: 19

@1   -> - - - - - - - - - - - - - - - -  | - * - - - * * * | CLK1
@68  -> * - - - - - - - - - - - - - - -  | - - * * * - - - | RADR9
@66  -> * - - - - - - - - - - - - - - *  | - - * - * - - - | RADR10
@36  -> * - - - - - - - - - - - - - * -  | - - * - * - - - | RADR11
@35  -> * - - - - - - - - - - - - - - -  | - - * * * - - - | RADR12
@34  -> * - - - - - - - - - - - - - - -  | - - * * * - - - | RADR13
@48  -> * - - - - - - - - - - - - * - -  | - - * - * @ - - | RADR14
@49  -> * - - - - - - - - - - - * - - -  | - - * - * @ - - | RADR15
@51  -> * - - - - - - - - - - * - - - -  | - - * - - @ * - | RADR16
@61  -> * - - - - - - - - - * - - - - -  | - - * - - - * @ | RADR17
@32  -> - - - - - - - - - - - - - - - -  | - - - - - * - * | RST1
@2   -> - * * * * * * * * * - - - - - -  | - - * * * - - - | ZERO1
MC96 -> - * * * * * * * * - * * * * * *  | - * * * * @ - * | INIT_
MC94 -> - * * * * * * * * * - - - - - -  | - * * * * @ - * | |LWSEQ: 557|~22~
MC92 -> - - - - - - - - - * - - - - - -  | - - * - * @ * * | |LWSEQ: 557|~27~
MC64 -> - * - - - - - - - * - - - - - -  | - - * @ * - - - | WCRY0
MC80 -> - - * * * * * * * - - - - - - -  | - - * * @ - - - | WCRY1
MC79 -> - - - - - - - - - * - - - - - -  | - - * - @ - - - | |8COUNT: 119|QB
MC78 -> - - - - - - - - - * - - - - - -  | - - * - @ - - - | |8COUNT: 119|QC
MC77 -> - - - - - - - - - * - - - - - -  | - - * - @ - - - | |8COUNT: 119|QD
MC76 -> - - - - - - - - - * - - - - - -  | - - * - @ - - - | |8COUNT: 119|QE
MC75 -> - - - - - - - - - * - - - - - -  | - - * - @ - * - | |8COUNT: 119|QF
MC74 -> - - - - - - - - - * - - - - - -  | - - * - @ - * - | |8COUNT: 119|QG
MC65 -> - - - * * * * * * - - - - - - -  | - - * - @ - - - | |8COUNT: 122|QB
MC60 -> - - - - - - - - - - * * * * * *  | - - * @ - * - - | |7474: 417|1Q
MC56 -> - * * * * * * * * * - - - - - -  | - - * @ * - - - | |7476: 598|1Q
MC53 -> * - - - - - - - - - - - - - - -  | - - * @ - - - - | |74273: 457|: 12
MC52 -> * - - - - - - - - - - - - - - -  | - - * @ - - - - | |74273: 458|: 16
MC51 -> * - - - - - - - - - - - - - - -  | - - * @ - - - - | |74273: 458|: 17
```

Logic Array Block "D":

```
        M M M M M M M M M M M M M M
        C C C C C C C C C C C C C C
        6 6 6 6 6 5 5 5 5 5 5 5 5 5
        4 3 2 1 0 9 8 7 6 5 4 3 2 1
        | | | | | | | | | | | | | |  | A B C D E F G H | Name
MC64 -> - - - - - - - - - - - - - -  | - - * @ * - - - | WCRY0
MC63 -> - - * - - - - - - - - - - -  | - - - @ - - - - | : 496
MC62 -> - - - - - - - - - - - - - -  | - - - @ - * - * | |7474: 217|1Q
MC61 -> - - - - - - - - - - - - - -  | - - - @ - - - * | |7474: 360|1Q
MC60 -> - - - - - * - - - - - * * *  | - - * @ - * - - | |7474: 417|1Q
```

```
MC59 -> - - - - * - - * - - - - - - | - - - @ - - - - | |7474: 507 |1Q
MC58 -> - - - - - - - - - - - - - - | - - - @ - * - * | |7474: 508 |1Q
MC57 -> - - - - - - - - - - - - - - | - * - @ - - - - | |7474: 516 |1Q
MC56 -> - - * - - - - - * * * - - - | - - * @ * - - - | |7476: 598 |1Q
MC55 -> * - - - - - - - - * * - - - | - - - @ * - - - | |74161: 46 |QA
MC54 -> * - - - - - - - - - * - - - | - - - @ * - - - | |74161: 46 |QB
MC53 -> - - - - - - - - - - - - - - | - - * @ - - - - | |74273: 457 |: 12
MC52 -> - - - - - - - - - - - - - - | - - * @ - - - - | |74273: 458 |: 16
MC51 -> - - - - - - - - - - - - - - | - - * @ - - - - | |74273: 458 |: 17

@1    -> - - - - - - - - - - - - - - | - * - - - * * * | CLK1
@4    -> - - - - * - * * - - - - - - | @ - - * - - * - | DSP_A18
@25   -> - - - - * - * * - - - - - - | - - - @ - - * - | DSP_RW
@26   -> - - - - * - * * - - - - - - | - - - @ - - * - | DSP_TS
@27   -> - - - * - - - - - - - - - - | - - - @ - - - - | HOST_SI
@68   -> - - - - - - - - - - - * - - | - - * * * - - - | RADR9
@66   -> - - - - - - - - - - - - - - | - - * - * - - - | RADR10
@36   -> - - - - - - - - - - - - - - | - - * - * - - - | RADR11
@35   -> - - - - - - - - - - - - - * | - - * * * - - - | RADR12
@34   -> - - - - - - - - - - - - * - | - - * * * - - - | RADR13
@32   -> - - - - - - - - - - - - - - | - - - - - * - * | RST1
@55   -> - - - - * - * * - - - - - - | - - - * - - @ - | TEST
@2    -> - - * - - - - - * * * - - - | - - * * * - - - | ZERO1
MC113-> - - - - - - - * - - - - - - | - - - * - * - @ | CAS
MC48 -> - - - - * - - * - - - - - - | - - @ * - - - - | |COMP: 416 |NEQ
MC96 -> - - * * * * * * * * * * * * | - * * * * @ - * | INIT
MC94 -> - - * * - - - - * * * - - - | - * * * * @ - * | |LWSEQ: 557 |~22~
MC118-> - - - - * - - * - - - - - - | - - - * * * * @ | TRG
MC80 -> - - * - - - - - - - - - - - | - - * * @ - - - | WCRY1
MC32 -> - - - - - - * - - - - - - - | - @ - * - - - - | |8COUNT: 395 |QA
MC31 -> - - - - - - * - - - - - - - | - @ - * - - - - | |8COUNT: 395 |QB
MC30 -> - - - - - - * - - - - - - - | - @ - * - - - - | |8COUNT: 395 |QC
MC29 -> - - - - - - * - - - - - - - | - @ - * - - - - | |8COUNT: 395 |QD
MC28 -> - - - - - - * - - - - - - - | - @ - * - - - - | |8COUNT: 395 |QE
MC27 -> - - - - - - * - - - - - - - | - @ - * - - - - | |8COUNT: 395 |QF
MC26 -> - - - - - - * - - - - - - - | - @ - * - - - - | |8COUNT: 395 |QG
MC25 -> - - - - - - * - - - - - - - | - @ - * - - - - | |8COUNT: 395 |QH
MC83 -> - * - - - - - - - - - - - - | - - - * - @ - * | |7474: 233 |1Q
MC127-> - - - - - - * - - - - - - - | - * - * - - - @ | |7474: 508 |2Q
MC23 -> - - - - - - - * - - - - - - | - @ - * - - - - | |7474: 516 |2Q
MC20 -> - - - - - - * - - - - - - - | - @ - * - - - - | |74164: 551 |QA
```

Logic Array Block "E":

```
        M M M M M M M M M M M M M M M M
        C C C C C C C C C C C C C C C C
        6 6 6 6 7 7 7 8 7 7 7 7 7 7 7 6
        6 7 8 9 0 1 2 0 9 8 7 6 5 4 3 5
        | | | | | | | | | | | | | | | | | A B C D E F G H | Name
MC66 -> - - - - - - - - - - - - - - - - | - - - - @ - - - | VADR0
MC67 -> - - - - - - - - - - - - - - - - | - - - - @ - - - | VADR1
MC68 -> - - - - - - - - - - - - - - - - | - - - - @ - - - | VADR2
MC69 -> - - - - - - - - - - - - - - - - | - - - - @ - - - | VADR3
MC70 -> - - - - - - - - - - - - - - - - | - - - - @ - - - | VADR4
MC71 -> - - - - - - - - - - - - - - - - | - - - - @ - - - | VADR5
MC72 -> - - - - - - - - - - - - - - - - | - - - - @ - - - | VADR6
MC80 -> - - - - - - - - - - - - - - - * | - - * * @ - - - | WCRY1
MC79 -> - - - * - - - * * * * * * * * - | - - * - @ - - - | |8COUNT: 119 |QB
MC78 -> - - - - * - - * - * - * * * * - | - - * - @ - - - | |8COUNT: 119 |QC
MC77 -> - - - - - * - * - - * * * * * - | - - * - @ - - - | |8COUNT: 119 |QD
MC76 -> - - - - - - * * - - - * * * * - | - - * - @ - - - | |8COUNT: 119 |QE
MC75 -> - - - - - - - * - - - - * * * - | - - * - @ - * - | |8COUNT: 119 |QF
MC74 -> - - - - - - - * - - - - - * * - | - - * - @ - * - | |8COUNT: 119 |QG
MC73 -> * - - - - - - * - - - - - - * - | - - - - @ - - - | |8COUNT: 119 |QH
MC65 -> - - * - - - - - - - - - - - - * | - - * - @ - - - | |8COUNT: 122 |QB
```

```
@13   -> * * * * * * * - - - - - - - - - | - @ - - * - * * | ATE
@1    -> - - - - - - - - - - - - - - - - | - * - - - * * * | CLK1
@29   -> * - - - - - - - - - - - - - - - | - - - @ * - - - | RADR0
@30   -> - * - - - - - - - - - - - - - - | - - - @ * - - - | RADR1
@31   -> - - * - - - - - - - - - - - - - | - - - @ * - - - | RADR2
@14   -> - - - * - - - - - - - - - - - - | - @ - - * - -   | RADR3
@15   -> - - - - * - - - - - - - - - - - | - @ - - * - - - | RADR4
@38   -> - - - - - * - - - - - - - - - - | - - - - @ - - - | RADR5
@22   -> - - - - - - * - - - - - - - - - | - - @ - * - - - | RADR6
@68   -> * - - - - - - - - - - - - - - - | - - * * * - - - | RADR9
@66   -> - * - - - - - - - - - - - - - - | - - * - * - - - | RADR10
@36   -> - - * - - - - - - - - - - - - - | - - * - * - - - | RADR11
@35   -> - - - * - - - - - - - - - - - - | - - * * * - - - | RADR12
@34   -> - - - - * - - - - - - - - - - - | - - * * * - - - | RADR13
@48   -> - - - - - * - - - - - - - - - - | - - * - * @ - - | RADR14
@49   -> - - - - - - * - - - - - - - - - | - - * - * @ - - | RADR15
@32   -> - - - - - - - - - - - - - - - - | - - - - - * - * | RST1
@2    -> - - - - - - - - * * * * * * * * | - - * * * - - - | ZERO1
MC96  -> - - - - - - - - * * * * * * * * | - * * * * @ - * | INIT_
MC94  -> - - - - - - - - * * * * * * * * | - * * * * @ - * |  |LWSEQ: 557|-22-
MC92  -> * * * * * * * - - - - - - - - - | - - * - * @ * * |  |LWSEQ: 557|-27-
MC118-> * * * * * * * - - - - - - - - - | - - - * * * * @ | TRG
MC64  -> - - - - - - - * * * * * * * * - | - - * @ * - - - | WCRY0
MC47  -> - - * - - - - * * * * * * * * - | - - @ - * - - - |  |8COUNT: 119|QA
MC46  -> - * - - - - - - - - - - - - - * | - - @ - * - - - |  |8COUNT: 122|QA
MC45  -> - - - * - - - - - - - - - - - - | - - @ - * - - - |  |8COUNT: 122|QC
MC44  -> - - - - * - - - - - - - - - - - | - - @ - * - - - |  |8COUNT: 122|QD
MC43  -> - - - - - * - - - - - - - - - - | - - @ - * - - - |  |8COUNT: 122|QE
MC42  -> - - - - - - * - - - - - - - - - | - - @ - * - - - |  |8COUNT: 122|QF
MC56  -> - - - - - - - - * * * * * * * * | - - * @ * - - - |  |7476: 598|1Q
MC55  -> * - - - - - - - - - - - - - - - | - - - @ * - - - |  |74161: 46|QA
MC54  -> - * - - - - - - - - - - - - - - | - - - @ * - - - |  |74161: 46|QB
```

Logic Array Block "F":

```
         M M M M M M M M M M M M M M M
         C C C C C C C C C C C C C C C
         9 9 9 9 9 9 9 8 8 8 8 8 8 8 8
         6 5 4 3 2 1 0 9 8 7 6 5 3 2 1
         | | | | | | | | | | | | | | | | A B C D E F G H | Name
MC96  -> - - - - - * * * * * * * - - - | - * * * * @ - * | INIT_
MC95  -> - - - - - - - - - - - - - - - | * - - - - @ - - |  |LWSEQ: 557|REFOFF
MC94  -> - * * * * - - - - - - - - - - | - * * * * @ - * |  |LWSEQ: 557|-22-
MC93  -> * * * * * - - - - - - - - - - | - - - - - @ - * |  |LWSEQ: 557|-23-
MC92  -> - - * * * - - - - - - - - - - | - - * - * @ * * |  |LWSEQ: 557|-27-
MC91  -> - - - - * * * * * * * * - * - | - - - - - @ - * |  |8COUNT: 231|QA
MC90  -> - - - - * - * * * * * * - * - | - - - - - @ - * |  |8COUNT: 231|QB
MC89  -> - - - - * - - * * * * * - * - | - - - - - @ - * |  |8COUNT: 231|QC
MC88  -> - - - - * - - - * * * * - * - | - - - - - @ - * |  |8COUNT: 231|QD
MC87  -> - - - - * - - - - * * * - * - | - - - - - @ - * |  |8COUNT: 231|QE
MC86  -> - - - - * - - - - - * * - * - | - - - - - @ - * |  |8COUNT: 231|QF
MC85  -> - - - - * - - - - - - * - * - | - - - - - @ - * |  |8COUNT: 231|QG
MC83  -> - - - - * * * * * * * * * - - | - - - - * - @ - * |  |7474: 233|1Q
MC82  -> - - - - * - - - - - - - - - - | - - - - - @ - * |  |7474: 417|2Q
MC81  -> - - * - - - - - - - - - - - - | - - - - - @ - * |  |7474: 421|2Q

@1    -> - - * * * * * * * * * * * * * | - * - - - * * * | CLK1
@28   -> - - - - - - - - - - - - - - * | - - - @ - * - - | LOAD1
@68   -> - - - - - - - - - - - - - - - | - - * * * - - - | RADR9
@66   -> - - - - - - - - - - - - - - - | - - * - * - - - | RADR10
@36   -> - - - - - - - - - - - - - - - | - - * - * - - - | RADR11
@35   -> - - - - - - - - - - - - - - - | - - * * * - - - | RADR12
@34   -> - - - - - - - - - - - - - - - | - - * * * - - - | RADR13
@32   -> - - * * * - - - - - - - - - - | - - - - - * - * | RST1
@2    -> - - - - - - - - - - - - - - - | - - * * * - - - | ZERO1
MC113-> - * * * * - - - - - - - - - - | - - - * - * - @ | CAS
```

```
MC119-> - - - - * - - - - - - - - * - | - - - - - * - @ | LW_HPTY
MC115-> - - - - * - - - - - - - - * - | - - - - - * - @ | LW_IRDY
MC117-> - * * * * - - - - - - - - - - | - - - - - * - @ | RAS_
MC118-> - - * * * - - - - - - - - - - | - - - * * * * @ | TRG_
MC120-> - - * * * - - - - - - - - - - | - - - - - * - @ | WEN
MC62 -> - - - - * - - - - - - - * - - | - - - @ - * - * |  |7474:217|1Q
MC24 -> - - - - * * * * * * * * - - - | - @ - - - * - * |  |7474:233|2Q
MC128-> - - - - * - - - - - - - - - - | - - - - - * - @ |  |7474:360|2Q
MC60 -> - - - - - - - - - - - - - * - | - - * @ - * - - |  |7474:417|1Q
MC39 -> - - - - * - - - - - - - - - - | - - @ - - * - * |  |7474:421|1Q
MC58 -> - - - - * - - - - - - - - - - | - - - @ - * - * |  |7474:508|1Q
MC16 -> - - - - * - - - - - - - - - - | @ - - - - * - * |  |7474:581|1Q
```

Logic Array Block "G":

```
        M M M M M M M M M M M M M
        C C C C C C C C C C C C C
        9 1 1 9 1 1 1 1 1 1 1 1 1
        7 0 0 8 1 1 1 0 0 0 0 0 0
        | 0 1 | 2 1 0 9 8 7 6 5 4 | A B C D E F G H | Name
MC97 -> - - - - - - - - - - - - - | - - - - - - @ - | REF_ON_
MC100-> - - - - - - - - - - - - - | - - - - - - @ - | VADR7
MC101-> - - - - - - - - - - - - - | - - - - - - @ - | VADR8
MC98 -> - - - - - - - - - - - - - | - - - - - - @ - | V_SE
MC112-> * - - - * * * * * * * * * | * - - - - - @ - |  |8COUNT:578|QA
MC111-> * - - - - * * * * * * * * | * - - - - - @ - |  |8COUNT:578|QB
MC110-> * - - - - - * * * * * * * | * - - - - - @ - |  |8COUNT:578|QC
MC109-> * - - - - - - * * * * * * | * - - - - - @ - |  |8COUNT:578|QD
MC108-> * - - - - - - - * * * * * | * - - - - - @ - |  |8COUNT:578|QE
MC107-> * - - - - - - - - * * * * | * - - - - - @ - |  |8COUNT:578|QF
MC106-> * - - - - - - - - - * * * | * - - - - - @ - |  |8COUNT:578|QG
MC105-> * - - - - - - - - - - * * | * - - - - - @ - |  |8COUNT:578|QH
MC104-> * - - - * * * * * * * * * | * - - - - - @ - |  |7474:581|2Q

@13  -> * * * * - - - - - - - - - | - @ - - * - * * | ATE
@1   -> - - - - * * * * * * * * * | - * - - - * * * | CLK1
@4   -> - - - * - - - - - - - - - | @ - - * - - * - | DSP_A18
@25  -> - - - * - - - - - - - - - | - - - @ - - * - | DSP_RW
@26  -> - - - * - - - - - - - - - | - - - @ - - * - | DSP_TS
@23  -> - * - - - - - - - - - - - | - - @ - - - * - | RADR7
@47  -> - - * - - - - - - - - - - | - - - - - @ * - | RADR8
@68  -> - - - - - - - - - - - - - | - - * * * - - - | RADR9
@66  -> - - - - - - - - - - - - - | - - * - * - - - | RADR10
@36  -> - - - - - - - - - - - - - | - - * - * - - - | RADR11
@35  -> - - - - - - - - - - - - - | - - * * * - - - | RADR12
@34  -> - - - - - - - - - - - - - | - - * * * - - - | RADR13
@51  -> - * - - - - - - - - - - - | - - * - - @ * - | RADR16
@61  -> - - * - - - - - - - - - - | - - * - - - * @ | RADR17
@32  -> - - - - - - - - - - - - - | - - - - - * - * | RST1
@55  -> - - - * - - - - - - - - - | - - - * - - @ - | TEST
@2   -> - - - - - - - - - - - - - | - - * * * - - - | ZERO1
MC92 -> - * * - - - - - - - - - - | - - * - * @ * * |  |LWSEQ:557|-27-
MC118-> - * * - - - - - - - - - - | - - - * * * * @ | TRG
MC75 -> - * - - - - - - - - - - - | - - * - @ - * - |  |8COUNT:119|QF
MC74 -> - - * - - - - - - - - - - | - - * - @ - * - |  |8COUNT:119|QG
MC41 -> - * - - - - - - - - - - - | - - @ - - - * - |  |8COUNT:122|QG
MC40 -> - - * - - - - - - - - - - | - - @ - - - * - |  |8COUNT:122|QH
```

Logic Array Block "H":

```
        M M M M M M M M M
        C C C C C C C C C
        1 1 1 1 1 1 1 1 1
        1 1 1 1 1 1 2 2 2
        3 9 5 4 7 8 0 8 7 | A B C D E F G H | Name
MC113-> * - - - * * * - - | - - - * - * - @ | CAS_
MC119-> - * * * * * - - - | - - - - - * - @ | LW_HPTY
```

```
MC115-> - - * * * * - - -  | - - - - - * - @ | LW_IRDY
MC114-> - - - - - - - - -  | - - - - - - - @ | LW_ORDY
MC117-> * - - - * * * - -  | - - - - - * - @ | RAS_
MC118-> * - - - * * * - -  | - - - * * * * @ | TRG_
MC120-> * - - - * * * - -  | - - - - - * - @ | WEN
MC128-> - - - - * * - - -  | - - - - - * - @ |  |7474: 360 |2Q
MC127-> - - - - - - - - -  | - * - * - - - @ |  |7474: 508 |2Q

@13  -> * * * * * * * - -  | - @ - - * -     | ATE
@1   -> * * * - * * * * *  | - * - - - * * * | CLK1
@68  -> - - - - - - - - -  | - - * * * - - - | RADR9
@66  -> - - - - - - - - -  | - - * - * - - - | RADR10
@36  -> - - - - - - - - -  | - - * - * - - - | RADR11
@35  -> - - - - - - - - -  | - - * * * - - - | RADR12
@34  -> - - - - - - - - -  | - - * * * - - - | RADR13
@32  -> * - - - * * * - -  | - - - - - * - * | RST1
@2   -> - - - - - - - - -  | - - * * * - - - | ZERO1
MC96 -> - * * - - - - * -  | - * * * * @ - * | INIT_
MC94 -> * - - - * * * * -  | - * * * * @ - * |  |LWSEQ: 557 |-22-
MC93 -> * - - - * * * - -  | - - - - - @ - * |  |LWSEQ: 557 |-23-
MC92 -> * - - - * * * - -  | - - * - * @ * * |  |LWSEQ: 557 |-27-
MC91 -> - * * * * * - - -  | - - - - - @ - * |  |8COUNT: 231 |QA
MC90 -> - * * * * * - - -  | - - - - - @ - * |  |8COUNT: 231 |QB
MC89 -> - * * * * * - - -  | - - - - - @ - * |  |8COUNT: 231 |QC
MC88 -> - * * * * * - - -  | - - - - - @ - * |  |8COUNT: 231 |QD
MC87 -> - * * * * * - - -  | - - - - - @ - * |  |8COUNT: 231 |QE
MC86 -> - * * * * * - - -  | - - - - - @ - * |  |8COUNT: 231 |QF
MC85 -> - * * * * * - - -  | - - - - - @ - * |  |8COUNT: 231 |QG
MC62 -> - - - - * * - - -  | - - - @ - * - * |  |7474: 217 |1Q
MC83 -> - * * - * * - - -  | - - - * - @ - * |  |7474: 233 |1Q
MC24 -> - * * - * * - - -  | - @ - - - * - * |  |7474: 233 |2Q
MC61 -> - - - - - - - * -  | - - - @ - - - * |  |7474: 360 |1Q
MC82 -> - - - - * * - - -  | - - - - - @ - * |  |7474: 417 |2Q
MC39 -> - - - - * * - - -  | - - @ - - * - * |  |7474: 421 |1Q
MC81 -> - - - - - * - - -  | - - - - - @ - * |  |7474: 421 |2Q
MC58 -> - - - - * * - - *  | - - - @ - * - * |  |7474: 508 |1Q
MC16 -> - - - - * - - - -  | @ - - - - * - * |  |7474: 581 |1Q
```

EQUATIONS

```
DSP_RW    : INPUT;
DSP_TS    : INPUT;
TEST_     : INPUT;
DSP_A18   : INPUT;
ATE_      : INPUT;
HOST_SI   : INPUT;
LOAD1     : INPUT;
CLK1      : INPUT;
RST1      : INPUT;
DSP_D0    : INPUT;
DSP_D1    : INPUT;
DSP_D2    : INPUT;
DSP_D3    : INPUT;
DSP_D4    : INPUT;
DSP_D5    : INPUT;
DSP_D6    : INPUT;
DSP_D7    : INPUT;
ZERO1     : INPUT;
RADR9     : INPUT;
RADR10    : INPUT;
RADR11    : INPUT;
RADR12    : INPUT;
RADR13    : INPUT;
RADR14    : INPUT;
RADR15    : INPUT;
RADR16    : INPUT;
RADR17    : INPUT;
```

```
RADR8     : INPUT;
RADR4     : INPUT;
RADR5     : INPUT;
RADR7     : INPUT;
RADR6     : INPUT;
RADR2     : INPUT;
RADR3     : INPUT;
RADR1     : INPUT;
RADR0     : INPUT;

% |7474:581|1Q %
 _MC016  = DFF(  GND $  GND,  GND,  _MC095,  _EQ001 );
  _EQ001 =  _X001;
  _X001  = EXP( !_MC104 & !_MC105 & !_MC106 & !_MC107 & !_MC108 & !_MC109 &
              !_MC110 & !_MC111 & !_MC112 );

DSP_TA_  = TRI(  _MC017, !ATE);
 _MC017  = MCELL(  _EQ002 $  VCC );
  _EQ002 = !_MC022 &  _MC023
         #  _MC019 & !_MC020;

% |74164:551|QC %
 _MC018  = DFF(  _MC019 $  GND, SCLK( CLK1 ),  VCC,  VCC );

% |74164:551|QB %
 _MC019  = DFF(  _MC020 $  GND, SCLK( CLK1 ),  VCC,  VCC );

% |74164:551|QA %
 _MC020  = DFF(  _MC127 $  GND, SCLK( CLK1 ),  VCC,  VCC );

V_SCLK   = TRI(  _MC021, !ATE);
 _MC021  = MCELL(  _EQ003 $  GND );
  _EQ003 = !INIT_ &  _MC094
         # !_MC022 &  _MC023;

% |7474:537|1Q %
 _MC022  = DFF(  _MC023 $  GND, SCLK( CLK1 ),  VCC,  VCC );

% |7474:516|2Q %
 _MC023  = DFF(  _MC057 $  GND, SCLK( CLK1 ),  VCC,  VCC );

% |7474:233|2Q %
 _MC024  = DFF(  _EQ004 $  GND, SCLK( CLK1 ),  VCC,  VCC );
  _EQ004 =  _MC018 &  _MC127;

% |8COUNT:395|QH %
 _MC025  = DFF(  _EQ005 $  _EQ006, SCLK( CLK1 ),  INIT_,  VCC );
  _EQ005 =  _MC020 & !_MC026 & !_MC027 & !_MC028 & !_MC029 & !_MC030 &
           !_MC031 & !_MC032 &  _MC127
         #  DSP_D7 & !_MC020 &  _MC127;
  _EQ006 =  _MC020 &  _MC025;

% |8COUNT:395|QG %
 _MC026  = DFF(  _EQ007 $  _EQ008, SCLK( CLK1 ),  INIT_,  VCC );
  _EQ007 =  _MC020 & !_MC027 & !_MC028 & !_MC029 & !_MC030 & !_MC031 &
           !_MC032 &  _MC127
         #  DSP_D6 & !_MC020 &  _MC127;
  _EQ008 =  _MC020 &  _MC026;

% |8COUNT:395|QF %
 _MC027  = DFF(  _EQ009 $  _EQ010, SCLK( CLK1 ),  INIT_,  VCC );
  _EQ009 =  _MC020 & !_MC028 & !_MC029 & !_MC030 & !_MC031 & !_MC032 &
            _MC127
         #  DSP_D5 & !_MC020 &  _MC127;
  _EQ010 =  _MC020 &  _MC027;
```

```
% |8COUNT:395|QE %
 _MC028  = DFF(  _EQ011 $  _EQ012, SCLK( CLK1 ),  INIT_,  VCC );
  _EQ011 =  _MC020 & !_MC029 & !_MC030 & !_MC031 & !_MC032 &  _MC127
         #  DSP_D4 & !_MC020 &  _MC127;
  _EQ012 =  _MC020 &  _MC028;

% |8COUNT:395|QD %
 _MC029  = DFF(  _EQ013 $  _EQ014, SCLK( CLK1 ),  INIT_,  VCC );
  _EQ013 =  _MC020 & !_MC030 & !_MC031 & !_MC032 &  _MC127
         #  DSP_D3 & !_MC020 &  _MC127;
  _EQ014 =  _MC020 &  _MC029;

% |8COUNT:395|QC %
 _MC030  = DFF(  _EQ015 $  _EQ016, SCLK( CLK1 ),  INIT_,  VCC );
  _EQ015 =  _MC020 & !_MC031 & !_MC032 &  _MC127
         #  DSP_D2 & !_MC020 &  _MC127;
  _EQ016 =  _MC020 &  _MC030;

% |8COUNT:395|QB %
 _MC031  = DFF(  _EQ017 $  _EQ018, SCLK( CLK1 ),  INIT_,  VCC );
  _EQ017 =  DSP_D1 & !_MC020 &  _MC127
         #  _MC020 & !_MC032 &  _MC127;
  _EQ018 =  _MC020 &  _MC031;

% |8COUNT:395|QA %
 _MC032  = DFF(  _EQ019 $  GND, SCLK( CLK1 ),  INIT_,  VCC );
  _EQ019 =  _MC020 &  _MC032 & !_MC127
         #  DSP_D0 & !_MC020 &  _MC127
         #  _MC020 & !_MC032 &  _MC127;

% |74273:458|:15 %
 _MC033  = DFF(  RADR14 $  GND, !_MC060,  INIT_,  VCC );

% |74273:458|:18 %
 _MC034  = DFF(  RADR11 $  GND, !_MC060,  INIT_,  VCC );

% |74273:458|:19 %
 _MC035  = DFF(  RADR10 $  GND, !_MC060,  INIT_,  VCC );

% |74273:458|:14 %
 _MC036  = DFF(  RADR15 $  GND, !_MC060,  INIT_,  VCC );

% |74273:458|:13 %
 _MC037  = DFF(  RADR16 $  GND, !_MC060,  INIT_,  VCC );

% |74273:458|:12 %
 _MC038  = DFF(  RADR17 $  GND, !_MC060,  INIT_,  VCC );

% |7474:421|1Q %
 _MC039  = DFF(  _EQ020 $  GND,  _MC094, !_MC092,  VCC );
  _EQ020 =  _MC047 &  _MC074 &  _MC075 &  _MC076 &  _MC077 &  _MC078 &
              _MC079 &  WCRY0
         #  _MC056 &  ZERO1;

% |8COUNT:122|QH %
 _MC040  = DFF(  _EQ021 $  _MC040,  _MC094,  INIT_,  VCC );
  _EQ021 =  _MC041 &  _MC042 &  _MC043 &  _MC044 &  _MC045 &  _MC046 &
              _MC056 &  _MC065 &  ZERO1
         #  _MC041 &  _MC042 &  _MC043 &  _MC044 &  _MC045 &  _MC046 &
              _MC065 &  WCRY1
         # !INIT_ &  _MC041 &  _MC042 &  _MC043 &  _MC044 &  _MC045 &  _MC046 &
              _MC065;

% |8COUNT:122|QG %
 _MC041  = DFF(  _EQ022 $  _MC041,  _MC094,  INIT_,  VCC );
  _EQ022 =  _MC042 &  _MC043 &  _MC044 &  _MC045 &  _MC046 &  _MC056 &
              MC065 &  ZERO1
```

```
        #  _MC042 &  _MC043 &  _MC044 &  _MC045 &  _MC046 &  _MC065 &  WCRY1
        # !INIT_ &  _MC042 &  _MC043 &  _MC044 &  _MC045 &  _MC046 &  _MC065;

% |8COUNT:122|QF  %
_MC042  = DFF(  _EQ023 $  _MC042,  _MC094,  INIT_,  VCC );
 _EQ023 =  _MC043 &  _MC044 &  _MC045 &  _MC046 &  _MC056 &  _MC065 &  ZERO1
        #  _MC043 &  _MC044 &  _MC045 &  _MC046 &  _MC065 &  WCRY1
        # !INIT_ &  _MC043 &  _MC044 &  _MC045 &  _MC046 &  _MC065;

% |8COUNT:122|QE  %
_MC043  = DFF(  _EQ024 $  _MC043,  _MC094,  INIT_,  VCC );
 _EQ024 =  _MC044 &  _MC045 &  _MC046 &  _MC056 &  _MC065 &  ZERO1
        #  _MC044 &  _MC045 &  _MC046 &  _MC065 &  WCRY1
        # !INIT_ &  _MC044 &  _MC045 &  _MC046 &  _MC065;

% |8COUNT:122|QD  %
_MC044  = DFF(  _EQ025 $  _MC044,  _MC094,  INIT_,  VCC );
 _EQ025 =  _MC045 &  _MC046 &  _MC056 &  _MC065 &  ZERO1
        #  _MC045 &  _MC046 &  _MC065 &  WCRY1
        # !INIT_ &  _MC045 &  _MC046 &  _MC065;

% |8COUNT:122|QC  %
_MC045  = DFF(  _EQ026 $  _MC045,  _MC094,  INIT_,  VCC );
 _EQ026 =  _MC046 &  _MC056 &  _MC065 &  ZERO1
        #  _MC046 &  _MC065 &  WCRY1
        # !INIT_ &  _MC046 &  _MC065;

% |8COUNT:122|QA  %
_MC046  = DFF(  _EQ027 $ !_MC046,  _MC094,  INIT_,  VCC );
 _EQ027 =  INIT_ & !WCRY1 & !ZERO1
        #  INIT_ & !_MC056 & !WCRY1;

% |8COUNT:119|QA  %
_MC047  = DFF(  _EQ028 $  GND,  _MC094,  INIT_,  VCC );
 _EQ028 =  INIT_ &  _MC047 & !WCRY0 &  _X002
        # !_MC047 &  WCRY0 &  _X002
        # !INIT_ & !_MC047 &  _X002;
 _X002  = EXP(  _MC056 &  ZERO1 );

% |COMP:416|NEQ  %
_MC048  = MCELL(  _EQ029 $  VCC );
 _EQ029 =  _X003 &  _X004 &  _X005 &  _X006 &  _X007 &  _X008 &  _X009 &
            _X010 &  _X011 &  _X012 &  _X013 &  _X014 &  _X015 &  _X016 &
            _X017 &  _X018 &  _X019 &  _X020;
 _X003  = EXP(  _MC053 & !RADR9 );
 _X004  = EXP( !_MC038 &  RADR17 );
 _X005  = EXP(  _MC052 & !RADR13 );
 _X006  = EXP( !_MC053 &  RADR9 );
 _X007  = EXP(  _MC038 & !RADR17 );
 _X008  = EXP( !_MC037 &  RADR16 );
 _X009  = EXP(  _MC037 & !RADR16 );
 _X010  = EXP( !_MC036 &  RADR15 );
 _X011  = EXP(  _MC036 & !RADR15 );
 _X012  = EXP( !_MC033 &  RADR14 );
 _X013  = EXP(  _MC033 & !RADR14 );
 _X014  = EXP( !_MC052 &  RADR13 );
 _X015  = EXP(  _MC035 & !RADR10 );
 _X016  = EXP( !_MC051 &  RADR12 );
 _X017  = EXP(  _MC051 & !RADR12 );
 _X018  = EXP( !_MC034 &  RADR11 );
 _X019  = EXP(  _MC034 & !RADR11 );
 _X020  = EXP( !_MC035 &  RADR10 );

% |74273:458|:17  %
_MC051  = DFF(  RADR12 $  GND, !_MC060,  INIT_,  VCC );
```

```
% |74273:458|:16 %
 _MC052  = DFF(  RADR13 $  GND, !_MC060,  INIT_,  VCC );

% |74273:457|:12 %
 _MC053  = DFF(  RADR9 $  GND, !_MC060,  INIT_,  VCC );

% |74161:46|QB %
 _MC054  = DFF(  _EQ030 $ VCC,  _MC094,  INIT_,  VCC );
  _EQ030 =  _MC054 &  _MC055
         #  _MC056 &  ZERO1
         # !_MC054 & !_MC055;

% |74161:46|QA %
 _MC055  = DFF(  _EQ031 $ !_MC055,  _MC094,  INIT_,  VCC );
  _EQ031 = !_MC055 &  _MC056 &  ZERO1;

% |7476:598|1Q %
 _MC056  = DFF(  _MC056 $  ZERO1, !_MC094,  INIT_,  VCC );

% |7474:516|1Q %
 _MC057  = DFF(  _EQ032 $  GND,  _EQ033,  _EQ034,  _EQ035 );
  _EQ032 = !_MC048 &  _MC059;
  _EQ033 =  DSP_RW & !DSP_TS &  _X021;
  _X021  = EXP( !DSP_A18 & !TEST );
  _EQ034 =  INIT_ & !_MC023;
  _EQ035 =  _X022;
  _X022  = EXP( !_MC113 & !_MC118 );

% |7474:508|1Q %
 _MC058  = DFF(  VCC $  GND,  _EQ036,  _EQ037,  VCC );
  _EQ036 = !DSP_RW & !DSP_TS &  _X021;
  _EQ037 =  INIT_ &  _X023;
  _X023  = EXP(  _MC020 & !_MC025 & !_MC026 & !_MC027 & !_MC028 & !_MC029 &
            !_MC030 & !_MC031 & !_MC032 &  _MC127 );

% |7474:507|1Q %
 _MC059  = DFF(  VCC $  GND, !_MC060,  INIT_,  VCC );

% |7474:417|1Q %
 _MC060  = DFF(  _EQ038 $  VCC,  _EQ039,  _EQ040,  VCC );
  _EQ038 = !_MC048 &  _MC059;
  _EQ039 =  DSP_RW & !DSP_TS &  _X021;
  _EQ040 =  INIT_ &  _MC118;

% |7474:360|1Q %
 _MC061  = DFF(  VCC $  GND, !HOST_SI,  _EQ041,  VCC );
  _EQ041 =  INIT_ & !_MC094;

% |7474:217|1Q %
 _MC062  = DFF(  _EQ042 $  VCC,  _MC094,  _EQ043,  VCC );
  _EQ042 =  INIT_ & !WCRY1 & !ZERO1
         #  INIT_ & !_MC056 & !WCRY1;
  _EQ043 =  INIT_ & !_MC063;

% :496 %
 _MC063  = MCELL(  _MC083 $  GND );

% WCRY0 %
 WCRY0   = MCELL(  _EQ044 $  GND );
  _EQ044 =  _MC054 &  _MC055;

% |8COUNT:122|QB %
 _MC065  = DFF(  _EQ045 $  _MC065,  _MC094,  INIT_,  VCC );
  _EQ045 =  _MC046 &  _MC056 &  ZERO1
         #  _MC046 &  WCRY1
         # !INIT_ &  _MC046;
```

```
VADR0     = TRI(  _MC066, !ATE);
 _MC066   = MCELL(  _EQ046 $  _EQ047 );
  _EQ046 =  _MC073 &  _MC092 &  _MC118
         #  _MC092 & !_MC118 &  RADR9
         # !_MC092 & !_MC118 &  RADR0;
  _EQ047 =  _MC055 & !_MC092 &  _MC118;

VADR1     = TRI(  _MC067, !ATE);
 _MC067   = MCELL(  _EQ048 $  _EQ049 );
  _EQ048 =  _MC046 &  _MC092 &  _MC118
         #  _MC092 & !_MC118 &  RADR10
         # !_MC092 & !_MC118 &  RADR1;
  _EQ049 =  _MC054 & !_MC092 &  _MC118;

VADR2     = TRI(  _MC068, !ATE);
 _MC068   = MCELL(  _EQ050 $  _EQ051 );
  _EQ050 =  _MC065 &  _MC092 &  _MC118
         #  _MC092 & !_MC118 &  RADR11
         # !_MC092 & !_MC118 &  RADR2;
  _EQ051 =  _MC047 & !_MC092 &  _MC118;

VADR3     = TRI(  _MC069, !ATE);
 _MC069   = MCELL(  _EQ052 $  _EQ053 );
  _EQ052 =  _MC045 &  _MC092 &  _MC118
         #  _MC092 & !_MC118 &  RADR12
         # !_MC092 & !_MC118 &  RADR3;
  _EQ053 =  _MC079 & !_MC092 &  _MC118;

VADR4     = TRI(  _MC070, !ATE);
 _MC070   = MCELL(  _EQ054 $  _EQ055 );
  _EQ054 =  _MC044 &  _MC092 &  _MC118
         #  _MC092 & !_MC118 &  RADR13
         # !_MC092 & !_MC118 &  RADR4;
  _EQ055 =  _MC078 & !_MC092 &  _MC118;

VADR5     = TRI(  _MC071, !ATE);
 _MC071   = MCELL(  _EQ056 $  _EQ057 );
  _EQ056 =  _MC043 &  _MC092 &  _MC118
         #  _MC092 & !_MC118 &  RADR14
         # !_MC092 & !_MC118 &  RADR5;
  _EQ057 =  _MC077 & !_MC092 &  _MC118;

VADR6     = TRI(  _MC072, !ATE);
 _MC072   = MCELL(  _EQ058 $  _EQ059 );
  _EQ058 =  _MC042 &  _MC092 &  _MC118
         #  _MC092 & !_MC118 &  RADR15
         # !_MC092 & !_MC118 &  RADR6;
  _EQ059 =  _MC076 & !_MC092 &  _MC118;

%  |8COUNT:119|QH  %
 _MC073   = DFF(  _EQ060 $  _EQ061,  _MC094,  INIT_,  VCC );
  _EQ060 =  _MC047 &  _MC074 &  _MC075 &  _MC076 &  _MC077 &  _MC078 &
              _MC079 &  WCRY0 &  _X002
         # !INIT_ &  _MC047 &  _MC074 &  _MC075 &  _MC076 &  _MC077 &  _MC078 &
              _MC079 &  _X002;
  _EQ061 =  _MC073 &  _X002;

%  |8COUNT:119|QG  %
 _MC074   = DFF(  _EQ062 $  _EQ063,  _MC094,  INIT_,  VCC );
  _EQ062 =  _MC047 &  _MC075 &  _MC076 &  _MC077 &  _MC078 &  _MC079 &  WCRY0 &
              _X002
         # !INIT_ &  _MC047 &  _MC075 &  _MC076 &  _MC077 &  _MC078 &  _MC079 &
              _X002;
  _EQ063 =  _MC074 &  _X002;
```

```
%  |8COUNT:119|QF  %
 _MC075  = DFF(  _EQ064 $  _EQ065,  _MC094,  INIT_,  VCC );
  _EQ064 =  _MC047 &  _MC076 &  _MC077 &  _MC078 &  _MC079 &  WCRY0 &  _X002
         # !INIT_ &  _MC047 &  _MC076 &  _MC077 &  _MC078 &  _MC079 &  _X002;
  _EQ065 =  _MC075 &  _X002;

%  |8COUNT:119|QE  %
 _MC076  = DFF(  _EQ066 $  _EQ067,  _MC094,  INIT_,  VCC );
  _EQ066 =  _MC047 &  _MC077 &  _MC078 &  _MC079 &  WCRY0 &  _X002
         # !INIT_ &  _MC047 &  _MC077 &  _MC078 &  _MC079 &  _X002;
  _EQ067 =  _MC076 &  _X002;

%  |8COUNT:119|QD  %
 _MC077  = DFF(  _EQ068 $  _EQ069,  _MC094,  INIT_,  VCC );
  _EQ068 =  _MC047 &  _MC078 &  _MC079 &  WCRY0 &  _X002
         # !INIT_ &  _MC047 &  _MC078 &  _MC079 &  _X002;
  _EQ069 =  _MC077 &  _X002;

%  |8COUNT:119|QC  %
 _MC078  = DFF(  _EQ070 $  _EQ071,  _MC094,  INIT_,  VCC );
  _EQ070 =  _MC047 &  _MC079 &  WCRY0 &  _X002
         # !INIT_ &  _MC047 &  _MC079 &  _X002;
  _EQ071 =  _MC078 &  _X002;

%  |8COUNT:119|QB  %
 _MC079  = DFF(  _EQ072 $  _EQ073,  _MC094,  INIT_,  VCC );
  _EQ072 =  _MC047 &  WCRY0 &  _X002
         # !INIT_ &  _MC047 &  _X002;
  _EQ073 =  _MC079 &  _X002;

%  WCRY1  %
 WCRY1   = MCELL(  _EQ074 $  GND );
  _EQ074 =  _MC047 &  _MC073 &  _MC074 &  _MC075 &  _MC076 &  _MC077 &
              _MC078 &  _MC079 &  WCRY0;

%  |7474:421|2Q  %
 _MC081  = DFF(  LOAD1 $  GND, SCLK( CLK1 ),  VCC,  VCC );

%  |7474:417|2Q  %
 _MC082  = DFF(  _EQ075 $  _MC060, SCLK( CLK1 ),  VCC,  VCC );
  _EQ075 =  _MC060 & !_MC085 & !_MC086 & !_MC087 & !_MC088 & !_MC089 &
             !_MC090 & !_MC091 &  _MC115 &  _MC119;

%  |7474:233|1Q  %
 _MC083  = DFF(  _EQ076 $  GND, SCLK( CLK1 ),  VCC,  VCC );
  _EQ076 =  _MC062 & !_MC083;

%  |8COUNT:231|QG  %
 _MC085  = DFF(  _EQ077 $  _MC085, SCLK( CLK1 ),  INIT_,  VCC );
  _EQ077 = !_MC024 &  _MC083 &  _MC086 &  _MC087 &  _MC088 &  _MC089 &
              _MC090 &  _MC091
         #  _MC024 & !_MC083 & !_MC086 & !_MC087 & !_MC088 & !_MC089 &
             !_MC090 & !_MC091;

%  |8COUNT:231|QF  %
 _MC086  = DFF(  _EQ078 $  _MC086, SCLK( CLK1 ),  INIT_,  VCC );
  _EQ078 = !_MC024 &  _MC083 &  _MC087 &  _MC088 &  _MC089 &  _MC090 &
              _MC091
         #  _MC024 & !_MC083 & !_MC087 & !_MC088 & !_MC089 & !_MC090 &
             !_MC091;

%  |8COUNT:231|QE  %
 _MC087  = DFF(  _EQ079 $  _MC087, SCLK( CLK1 ),  INIT_,  VCC );
  _EQ079 = !_MC024 &  _MC083 &  _MC088 &  _MC089 &  _MC090 &  _MC091
         #  _MC024 & !_MC083 & !_MC088 & !_MC089 & !_MC090 & !_MC091;
```

```
% |8COUNT:231|QD %
 _MC088  = DFF( _EQ080 $ _MC088, SCLK( CLK1 ), INIT_, VCC );
  _EQ080 = !_MC024 & _MC083 & _MC089 & _MC090 & _MC091
         # _MC024 & !_MC083 & !_MC089 & !_MC090 & !_MC091;

% |8COUNT:231|QC %
 _MC089  = DFF( _EQ081 $ _MC089, SCLK( CLK1 ), INIT_, VCC );
  _EQ081 = !_MC024 & _MC083 & _MC090 & _MC091
         # _MC024 & !_MC083 & !_MC090 & !_MC091;

% |8COUNT:231|QB %
 _MC090  = DFF( _EQ082 $ _MC090, SCLK( CLK1 ), INIT_, VCC );
  _EQ082 = !_MC024 & _MC083 & _MC091
         # _MC024 & !_MC083 & !_MC091;

% |8COUNT:231|QA %
 _MC091  = DFF( _EQ083 $ _MC091, SCLK( CLK1 ), INIT_, VCC );
  _EQ083 = !_MC024 & _MC083
         # _MC024 & !_MC083;

% |LWSEQ:557|-27- %
 _MC092  = DFF( _EQ084 $ _EQ085, SCLK( CLK1 ), RST1, VCC );
  _EQ084 = _MC016 & !_MC085 & !_MC086 & !_MC087 & !_MC088 & !_MC089 &
           !_MC090 & !_MC091 & _MC092 & _MC093 & !_MC094 & _MC113 &
            _MC115 & _MC117 & _MC118 & _MC119 & _MC120 & !_MC128 &
            _X024 & _X025 & _X026 & _X027 & _X028 & _X029 & _X030 &
            _X031 & _X032 & _X033 & _X034 & _X035 & _X036 & _X037 &
            _X038 & _X039 & _X040
         # !_MC039 & !_MC085 & !_MC086 & !_MC087 & !_MC088 & !_MC089 &
           !_MC090 & !_MC091 & !_MC092 & _MC093 & !_MC094 & _MC113 &
            _MC115 & !_MC117 & _MC118 & _MC119 & _MC120 & !_MC128 &
            _X024 & _X025 & _X026 & _X027 & _X028 & _X029 & _X030 &
            _X031 & _X032 & _X033 & _X034 & _X035 & _X036 & _X037 &
            _X038 & _X039 & _X040
         # _MC016 & !_MC024 & _MC083 & _MC092 & _MC093 & !_MC094 &
            _MC113 & _MC117 & _MC118 & _MC120 & _X024 & _X025 & _X026 &
            _X027 & _X028 & _X029 & _X030 & _X031 & _X032 & _X033 &
            _X034 & _X035 & _X036 & _X037 & _X038 & _X039 & _X040;
  _X024  = EXP( _MC016 & _MC024 & !_MC083 & _MC092 & _MC093 & !_MC094 &
            _MC113 & _MC117 & _MC118 & _MC120 );
  _X025  = EXP( _MC016 & !_MC082 & _MC092 & _MC093 & !_MC094 & _MC113 &
           !_MC115 & _MC117 & _MC118 & _MC120 );
  _X026  = EXP( _MC016 & !_MC082 & _MC092 & _MC093 & !_MC094 & _MC113 &
            _MC117 & _MC118 & _MC120 & !_MC128 );
  _X027  = EXP( !_MC024 & !_MC039 & _MC083 & !_MC092 & _MC093 & !_MC094 &
            _MC113 & !_MC117 & _MC118 & _MC120 );
  _X028  = EXP( _MC024 & !_MC039 & !_MC083 & !_MC092 & _MC093 & !_MC094 &
            _MC113 & !_MC117 & _MC118 & _MC120 );
  _X029  = EXP( !_MC039 & !_MC082 & !_MC092 & _MC093 & !_MC094 & _MC113 &
           !_MC115 & !_MC117 & _MC118 & _MC120 );
  _X030  = EXP( !_MC039 & !_MC082 & !_MC092 & _MC093 & !_MC094 & _MC113 &
           !_MC117 & _MC118 & _MC120 & !_MC128 );
  _X031  = EXP( _MC016 & _MC058 & _MC092 & _MC093 & !_MC094 & _MC113 &
            _MC117 & _MC118 & _MC120 );
  _X032  = EXP( _MC016 & _MC062 & _MC092 & _MC093 & !_MC094 & _MC113 &
            _MC117 & _MC118 & _MC120 );
  _X033  = EXP( !_MC039 & _MC058 & !_MC092 & _MC093 & !_MC094 & _MC113 &
           !_MC117 & _MC118 & _MC120 );
  _X034  = EXP( !_MC039 & _MC062 & !_MC092 & _MC093 & !_MC094 & _MC113 &
           !_MC117 & _MC118 & _MC120 );
  _X035  = EXP( _MC016 & !_MC092 & _MC093 & !_MC094 & !_MC113 & !_MC117 &
           !_MC118 & _MC120 );
  _X036  = EXP( !_MC092 & _MC093 & _MC094 & !_MC113 & !_MC117 & _MC118 &
           !_MC120 );
  _X037  = EXP( !_MC092 & _MC093 & !_MC094 & _MC113 & !_MC117 & !_MC118 &
            MC120 );
```

```
_X038  = EXP(  _MC092 &  _MC093 & !_MC094 &  _MC113 & !_MC117 &  _MC120 );
_X039  = EXP( !_MC092 &  _MC093 & !_MC094 &  _MC117 &  _MC118 &  _MC120 );
_X040  = EXP( !_MC092 &  _MC093 & !_MC094 & !_MC117 &  _MC118 & !_MC120 );
_EQ085 =  _X024 &  _X025 &  _X026 &  _X027 &  _X028 &  _X029 &  _X030 &
          _X031 &  _X032 &  _X033 &  _X034 &  _X035 &  _X036 &  _X037 &
          _X038 &  _X039 &  _X040;

% |LWSEQ:557|~23~ %
_MC093  = DFF(  _EQ086 $  VCC, SCLK( CLK1 ),  RST1,  VCC );
 _EQ086 = !_MC092 & !_MC093 & !_MC094 & !_MC113 & !_MC117 & !_MC118 &
          !_MC120
       #  _MC092 & !_MC093 & !_MC094 &  _MC113 &  _MC117 &  _MC120;

% |LWSEQ:557|~22~ %
_MC094  = DFF(  _EQ087 $  GND, SCLK( CLK1 ),  RST1,  VCC );
 _EQ087 = !_MC081 &  _MC092 & !_MC093 & !_MC094 &  _MC113 &  _MC117 &
           _MC118 &  _MC120
       # !_MC092 &  _MC093 & !_MC094 &  _MC113 & !_MC117 &  _MC118 &
          !_MC120;

% |LWSEQ:557|REFOFF %
_MC095  = MCELL(  _EQ088 $  VCC );
 _EQ088 = !_MC093 &  _MC094
       # !_MC113 &  _MC117;

% INIT_ %
INIT_   = MCELL(  _MC093 $  GND );

REF_ON_ = TRI(  _MC097, !ATE);
_MC097  = MCELL(  _EQ089 $  VCC );
 _EQ089 = !_MC104 & !_MC105 & !_MC106 & !_MC107 & !_MC108 & !_MC109 &
          !_MC110 & !_MC111 & !_MC112;

V_SE    = TRI(  _MC098, !ATE);
_MC098  = MCELL(  _EQ090 $  VCC );
 _EQ090 =  DSP_RW & !DSP_TS &  TEST
       #  DSP_A18 &  DSP_RW & !DSP_TS;

VADR7   = TRI(  _MC100, !ATE);
_MC100  = MCELL(  _EQ091 $  _EQ092 );
 _EQ091 =  _MC041 &  _MC092 &  _MC118
       #  _MC092 & !_MC118 &  RADR16
       # !_MC092 & !_MC118 &  RADR7;
 _EQ092 =  _MC075 & !_MC092 &  _MC118;

VADR8   = TRI(  _MC101, !ATE);
_MC101  = MCELL(  _EQ093 $  _EQ094 );
 _EQ093 =  _MC040 &  _MC092 &  _MC118
       #  _MC092 & !_MC118 &  RADR17
       # !_MC092 & !_MC118 &  RADR8;
 _EQ094 =  _MC074 & !_MC092 &  _MC118;

% |7474:581|2Q %
_MC104  = DFF(  _EQ095 $  GND, SCLK( CLK1 ),  VCC,  VCC );
 _EQ095 = !_MC104 & !_MC105 & !_MC106 & !_MC107 & !_MC108 & !_MC109 &
          !_MC110 & !_MC111 & !_MC112;

% |8COUNT:578|QH %
_MC105  = DFF(  _EQ096 $  _MC105, SCLK( CLK1 ),  VCC,  VCC );
 _EQ096 = !_MC104 &  _MC105 & !_MC106 & !_MC107 & !_MC108 & !_MC109 &
          !_MC110 & !_MC111 & !_MC112
       # !_MC105 & !_MC106 & !_MC107 & !_MC108 & !_MC109 & !_MC110 &
          !_MC111 & !_MC112
       #  _MC104 & !_MC105;
```

```
% |8COUNT:578|QG %
 _MC105  = DFF( _EQ097 $ _MC106, SCLK( CLK1 ), VCC, VCC );
  _EQ097 = !_MC104 & _MC106 & !_MC107 & !_MC108 & !_MC109 & !_MC110 &
             !_MC111 & !_MC112
         # !_MC106 & !_MC107 & !_MC108 & !_MC109 & !_MC110 & !_MC111 &
             !_MC112
         # _MC104 & !_MC106;

% |8COUNT:578|QF %
 _MC107  = DFF( _EQ098 $ _MC107, SCLK( CLK1 ), VCC, VCC );
  _EQ098 = !_MC104 & !_MC107 & !_MC108 & !_MC109 & !_MC110 & !_MC111 &
             !_MC112
         # _MC107 & !_MC108 & !_MC109 & !_MC110 & !_MC111 & !_MC112
         # _MC104 & _MC107;

% |8COUNT:578|QE %
 _MC108  = DFF( _EQ099 $ _MC108, SCLK( CLK1 ), VCC, VCC );
  _EQ099 = !_MC104 & !_MC108 & !_MC109 & !_MC110 & !_MC111 & !_MC112
         # _MC108 & !_MC109 & !_MC110 & !_MC111 & !_MC112
         # _MC104 & _MC108;

% |8COUNT:578|QD %
 _MC109  = DFF( _EQ100 $ _MC109, SCLK( CLK1 ), VCC, VCC );
  _EQ100 = !_MC104 & !_MC109 & !_MC110 & !_MC111 & !_MC112
         # _MC109 & !_MC110 & !_MC111 & !_MC112
         # _MC104 & _MC109;

% |8COUNT:578|QC %
 _MC110  = DFF( _EQ101 $ GND, SCLK( CLK1 ), VCC, VCC );
  _EQ101 = !_MC104 & !_MC110 & !_MC111 & !_MC112
         # !_MC104 & _MC110 & _MC111
         # !_MC104 & _MC110 & _MC112;

% |8COUNT:578|QB %
 _MC111  = DFF( _EQ102 $ GND, SCLK( CLK1 ), VCC, VCC );
  _EQ102 = !_MC104 & _MC111 & _MC112
         # !_MC104 & !_MC111 & !_MC112;

% |8COUNT:578|QA %
 _MC112  = DFF( _EQ103 $ !_MC104, SCLK( CLK1 ), VCC, VCC );
  _EQ103 = !_MC104 & _MC112;
  CAS_     = TRI( _MC113, !ATE);
   _MC113  = DFF( _EQ104 $ _EQ105, SCLK( CLK1 ), RST1, VCC );
    _EQ104 = !_MC092 & _MC093 & !_MC094 & _MC113 & !_MC117 & _MC118 &
               !_MC120
           # !_MC092 & _MC093 & !_MC094 & _MC113 & !_MC117 & !_MC118 &
               _MC120
           # !_MC092 & _MC093 & !_MC094 & _MC118 & _MC120 & _X041;
    _X041  = EXP( _MC113 & !_MC117 );
    _EQ105 = _X036;

  LW_ORDY  = TRI( _MC114, !ATE);
   _MC114  = MCELL( _EQ106 $ VCC );
    _EQ106 = !_MC085 & !_MC086 & !_MC087 & !_MC088 & !_MC089 & !_MC090 &
               !_MC091 & _MC115 & _MC119;

  LW_IRDY  = TRI( _MC115, !ATE);
   _MC115  = DFF( _EQ107 $ _MC115, SCLK( CLK1 ), VCC, INIT_ );
    _EQ107 = !_MC024 & _MC083 & _MC085 & _MC086 & _MC087 & _MC088 &
               _MC089 & _MC090 & _MC091 & !_MC119
           # _MC024 & !_MC083 & !_MC085 & !_MC086 & !_MC087 & !_MC088 &
               !_MC089 & !_MC090 & !_MC091 & _MC119;

  RAS_     = TRI( _MC117, !ATE);
   _MC117  = DFF( _EQ108 $ _EQ109, SCLK( CLK1 ), RST1, VCC );
    _EQ108 = !_MC016 & !_MC039 & !_MC085 & !_MC086 & !_MC087 & !_MC088 &
```

```
            !_MC089 & !_MC090 & !_MC091 & !_MC092 &  _MC093 & !_MC094 &
             _MC115 & !_MC117 &  _MC118 &  _MC119 &  _X040 &  _X042 &  _X043 &
             _X044 &  _X045 &  _X046 &  _X047 &  _X048 &  _X049 &  _X050 &
             _X051 &  _X052 &  _X053 &  _X054
        #  _MC024 & !_MC039 & !_MC058 & !_MC062 &  _MC083 & !_MC092 &
             _MC093 & !_MC094 &  _MC115 & !_MC117 &  _MC118 &  _MC128 &
             _X040 &  _X042 &  _X043 &  _X044 &  _X045 &  _X046 &  _X047 &
             _X048 &  _X049 &  _X050 &  _X051 &  _X052 &  _X053 &  _X054
        # !_MC024 & !_MC039 & !_MC058 & !_MC062 & !_MC083 & !_MC092 &
             _MC093 & !_MC094 &  _MC115 & !_MC117 &  _MC118 &  _MC128 &
             _X040 &  _X042 &  _X043 &  _X044 &  _X045 &  _X046 &  _X047 &
             _X048 &  _X049 &  _X050 &  _X051 &  _X052 &  _X053 &  _X054;
  _X042  = EXP(  _MC092 &  _MC093 & !_MC094 & !_MC117 &  _MC118 &  _MC120 );
  _X043  = EXP(  _MC024 & !_MC058 & !_MC062 &  _MC083 &  _MC092 &  _MC093 &
            !_MC094 &  _MC113 &  _MC115 &  _MC120 &  _MC128 );
  _X044  = EXP( !_MC024 & !_MC058 & !_MC062 & !_MC083 &  _MC092 &  _MC093 &
            !_MC094 &  _MC113 &  _MC115 &  _MC120 &  _MC128 );
  _X045  = EXP( !_MC016 &  _MC024 & !_MC039 & !_MC083 & !_MC092 &  _MC093 &
            !_MC094 & !_MC117 &  _MC118 );
  _X046  = EXP( !_MC016 & !_MC024 & !_MC039 &  _MC083 & !_MC092 &  _MC093 &
            !_MC094 & !_MC117 &  _MC118 );
  _X047  = EXP( !_MC016 & !_MC039 & !_MC092 &  _MC093 & !_MC094 &  _MC115 &
            !_MC117 &  _MC118 &  _MC128 );
  _X048  = EXP( !_MC016 & !_MC039 &  _MC062 & !_MC092 &  _MC093 & !_MC094 &
            !_MC117 &  _MC118 );
  _X049  = EXP( !_MC016 & !_MC039 &  _MC058 & !_MC092 &  _MC093 & !_MC094 &
            !_MC117 &  _MC118 );
  _X050  = EXP( !_MC016 & !_MC039 & !_MC082 & !_MC092 &  _MC093 & !_MC094 &
            !_MC117 &  _MC118 );
  _X051  = EXP(  _MC092 &  _MC093 & !_MC094 &  _MC113 & !_MC118 &  _MC120 );
  _X052  = EXP(  _MC093 & !_MC094 &  _MC113 & !_MC117 & !_MC118 &  _MC120 );
  _X053  = EXP( !_MC092 &  _MC093 & !_MC094 & !_MC113 &  _MC118 &  _MC120 );
  _X054  = EXP( !_MC092 &  _MC093 & !_MC113 & !_MC117 &  _MC118 & !_MC120 );
  _EQ109 =  _X040 &  _X042 &  _X043 &  _X044 &  _X045 &  _X046 &  _X047 &
             _X048 &  _X049 &  _X050 &  _X051 &  _X052 &  _X053 &  _X054;
TRG      = TRI(  _MC118, !ATE);
 _MC118  = DFF(  _EQ110 $  _MC093, SCLK( CLK1 ),  RST1,  VCC );
  _EQ110 =  _X055 &  _X056 &  _X057 &  _X058 &  _X059 &  _X060 &  _X061 &
             _X062 &  _X063 &  _X064 &  _X065 &  _X066 &  _X067 &  _X068 &
             _X069;
  _X055  = EXP( !_MC085 & !_MC086 & !_MC087 & !_MC088 & !_MC089 & !_MC090 &
            !_MC091 &  _MC093 &  _MC115 &  _MC118 &  _MC119 );
  _X056  = EXP(  _MC093 & !_MC113 );
  _X057  = EXP(  _MC092 &  _MC093 & !_MC117 &  _MC118 );
  _X058  = EXP( !_MC081 &  _MC092 & !_MC093 & !_MC094 &  _MC113 &  _MC117 &
            !_MC118 &  _MC120 );
  _X059  = EXP(  _MC093 &  _MC094 );
  _X060  = EXP( !_MC082 &  _MC093 &  _MC118 );
  _X061  = EXP( !_MC092 &  _MC093 &  _MC117 );
  _X062  = EXP(  _MC093 &  _MC113 & !_MC120 );
  _X063  = EXP(  _MC058 &  _MC093 &  _MC118 );
  _X064  = EXP(  _MC062 &  _MC093 &  _MC118 );
  _X065  = EXP( !_MC092 & !_MC093 & !_MC094 & !_MC113 & !_MC117 & !_MC118 &
            !_MC120 );
  _X066  = EXP(  _MC024 & !_MC083 &  _MC093 &  _MC118 );
  _X067  = EXP( !_MC024 &  _MC083 &  _MC093 &  _MC118 );
  _X068  = EXP(  _MC093 &  _MC115 &  _MC118 &  _MC128 );
  _X069  = EXP(  _MC039 & !_MC092 &  _MC093 &  _MC118 );

LW_HPTY  = TRI(  _MC119, !ATE);
 _MC119  = DFF(  _EQ111 $  _MC119, SCLK( CLK1 ),  VCC,  INIT_ );
  _EQ111 = !_MC024 &  _MC083 &  _MC085 &  _MC086 &  _MC087 &  _MC088 &
             _MC089 &  _MC090 &  _MC091
        #  _MC024 & !_MC083 & !_MC085 & !_MC086 & !_MC087 & !_MC088 &
            !_MC089 & !_MC090 & !_MC091;
WEN      = TRI(  _MC120, !ATE);
 _MC120  = DFF(  _EQ112 $  VCC, SCLK( CLK1 ),  RST1,  VCC );
```

```
 _EQ112 = !_MC092 &  _MC093 & !_MC094 &  _MC113 & !_MC117 &  _MC118 &
           !_MC120
        # !_MC092 &  _MC093 &  _MC094 & !_MC113 & !_MC117 &  _MC118 &
           !_MC120
        #  _MC092 &  _MC093 & !_MC094 & !_MC117 &  _MC118 &  _MC120;

% |7474:508|2Q  %
 _MC127  = DFF(  _MC058 $  GND, SCLK( CLK1 ),  VCC,  VCC );

% |7474:360|2Q  %
 _MC128  = DFF(  _MC061 $  GND, SCLK( CLK1 ),  _EQ113,  VCC );
  _EQ113 =  INIT_ & !_MC094;

%
    Expanders that are Duplicated in Multiple LABs:
    _X002 occurs in LABs --C-E---
    _X036 occurs in LABs -----F-H
    _X040 occurs in LABs -----F-H
%
```

D:\ELI\LWBUF.RPT

```
MAX+PLUS Compiler Report File
 Version 2.50  05/31/90

***** Design compiled without errors

Title: LW_BUFFER
Company: Scitex
Designer: ELI KATZIR
Rev: A
Date:  8:51a 11-13-1990
Turbo: ON
Security: OFF

                                D                               L
                D   D   D   D   D   S                   R       W           R
                S   S   S   S   S   P       Z   R       A       _           A
                P   P   P   P   P   _   E   C   A       D       H       R   D
                _   _   _   _   _   A   V   R   L   D   G   R   W   P   T   A   R
                D   D   D   D   D   1   C   O   K   R   N   1   E   T   R   S   1
                4   3   2   1   0   8   C   1   1   9   D   0   N   Y   G   _   7
              ---------------------------------------------------------------------
            / 9   8   7   6   5   4   3   2   1   68  67  66  65  64  63  62  61
    DSP_D5 | 10                                                                 60 | LW_IRDY
    DSP_D6 | 11                                                                 59 | LW_ORDY
   DSP_TA_ | 12                                                                 58 | CAS_
      ATE  | 13                                                                 57 | VADR8
     RADR3 | 14                                                                 56 | VADR7
     RADR4 | 15                                                                 55 | TEST
       GND | 16                                                                 54 | VCC
    V_SCLK | 17                                                                 53 | V_SE
  RESERVED | 18                           EPM5128-2                             52 | REF_ON_
  RESERVED | 19                                                                 51 | RADR16
       VCC | 20                                                                 50 | GND
  RESERVED | 21                                                                 49 | RADR15
     RADR6 | 22                                                                 48 | RADR14
     RADR7 | 23                                                                 47 | RADR8
    DSP_D7 | 24                                                                 46 | RESERVED
    DSP_RW | 25                                                                 45 | VADR6
    DSP_TS | 26                                                                 44 | VADR5
           |_ 27  28  29  30  31  32  33  34  35  36  37  38  39  40  41  42  43  _|
              ---------------------------------------------------------------------
                H   L   R   R   R   R   G   R   R   R   V   R   V   V   V   V   V
                O   O   A   A   A   S   N   A   A   A   C   A   A   A   A   A   A
                S   A   D   D   D   T   D   D   D   D   C   D   D   D   D   D   D
                T   D   R   R   R   1       R   R   R       R   R   R   R   R   R
                _   1   0   1   2           1   1   1       5   0   1   2   3   4
                S                           3   2   1
                I
```

| Logic Array Block | Macrocells | I/O Pins | Expanders | External Interconnect |
|---|---|---|---|---|
| A: MC1 - MC16 | 1/16( 6%) | 8/ 8(100%) | 1/32( 3%) | 10/24( 41%) |
| B: MC17 - MC32 | 16/16(100%) | 5/ 5(100%) | 0/32( 0%) | 13/24( 54%) |
| C: MC33 - MC48 | 16/16(100%) | 2/ 5( 40%) | 19/32( 59%) | 21/24( 87%) |
| D: MC49 - MC64 | 14/16( 87%) | 8/ 8(100%) | 3/32( 9%) | 23/24( 95%) |
| E: MC65 - MC80 | 16/16(100%) | 8/ 8(100%) | 1/32( 3%) | 24/24(100%) |
| F: MC81 - MC96 | 15/16( 93%) | 4/ 5( 80%) | 17/32( 53%) | 14/24( 58%) |
| G: MC97 - MC112 | 13/16( 81%) | 5/ 5(100%) | 0/32( 0%) | 15/24( 62%) |
| H: MC113 - MC128 | 9/16( 56%) | 8/ 8(100%) | 31/32( 96%) | 21/24( 87%) |

```
Total dedicated input pins used:     8/  8 (100%)
Total I/O pins used:                48/ 52 ( 92%)
Total macrocells used:             100/128 ( 78%)
Total expanders used:               72/256 ( 28%)

Total input pins required:          36
Total output pins required:         20
Total bidirectional pins required:   0
Total macrocells required:         100
Total expanders in database:        69

Synthesized macrocells:              0/128 (  0%)
```

```
|74240:593|
|74273:458|
|74273:457|
|7474:421|
|7474:417|
|7474:360|
|7474:581|
|7474:233|
|7474:217|
|7474:507|
|7474:516|
|7474:537|
|7474:508|
|7474:384|
|LWSEQ:557|
|7476:598|
|74161:46|
|COMP:416|
|74164:551|
|8COUNT:231|
|8COUNT:122|
|8COUNT:119|
|8COUNT:395|
|8COUNT:578|
|74253:587|
|74253:588|
|74253:589|
|74253:590|
|74253:591|
|74244:592|
```

| Pin | MCell | LAB | Primitive | Expanders Total | Expanders Shared | Fan-In INP | Fan-In FBK | Name |
|---|---|---|---|---|---|---|---|---|
| 13 | (18) | (B) | INPUT | 0 | 0 | 0 | 0 | ATE |
| 1 | - | - | INPUT | 0 | 0 | 0 | 0 | CLK1 |
| 4 | (1) | (A) | INPUT | 0 | 0 | 0 | 0 | DSP_A18 |
| 5 | (2) | (A) | INPUT | 0 | 0 | 0 | 0 | DSP_D0 |
| 6 | (3) | (A) | INPUT | 0 | 0 | 0 | 0 | DSP_D1 |
| 7 | (4) | (A) | INPUT | 0 | 0 | 0 | 0 | DSP_D2 |
| 8 | (5) | (A) | INPUT | 0 | 0 | 0 | 0 | DSP_D3 |

| | | | | | | | | |
|---|---|---|---|---|---|---|---|---|
| 9 | (6) | (A) | INPUT | 0 | 0 | 0 | 0 | DSP_D4 |
| 10 | (7) | (A) | INPUT | 0 | 0 | 0 | 0 | DSP_D5 |
| 11 | (8) | (A) | INPUT | 0 | 0 | 0 | 0 | DSP_D6 |
| 24 | (49) | (D) | INPUT | 0 | 0 | 0 | 0 | DSP_D7 |
| 25 | (50) | (D) | INPUT | 0 | 0 | 0 | 0 | DSP_RW |
| 26 | (51) | (D) | INPUT | 0 | 0 | 0 | 0 | DSP_TS |
| 27 | (52) | (D) | INPUT | 0 | 0 | 0 | 0 | HOST_SI |
| 28 | (53) | (D) | INPUT | 0 | 0 | 0 | 0 | LOAD1 |
| 29 | (54) | (D) | INPUT | 0 | 0 | 0 | 0 | RADR0 |
| 30 | (55) | (D) | INPUT | 0 | 0 | 0 | 0 | RADR1 |
| 31 | (56) | (D) | INPUT | 0 | 0 | 0 | 0 | RADR2 |
| 14 | (19) | (B) | INPUT | 0 | 0 | 0 | 0 | RADR3 |
| 15 | (20) | (B) | INPUT | 0 | 0 | 0 | 0 | RADR4 |
| 38 | (65) | (E) | INPUT | 0 | 0 | 0 | 0 | RADR5 |
| 22 | (36) | (C) | INPUT | 0 | 0 | 0 | 0 | RADR6 |
| 23 | (37) | (C) | INPUT | 0 | 0 | 0 | 0 | RADR7 |
| 47 | (82) | (F) | INPUT | 0 | 0 | 0 | 0 | RADR8 |
| 68 | - | - | INPUT | 0 | 0 | 0 | 0 | RADR9 |
| 66 | - | - | INPUT | 0 | 0 | 0 | 0 | RADR10 |
| 36 | - | - | INPUT | 0 | 0 | 0 | 0 | RADR11 |
| 35 | - | - | INPUT | 0 | 0 | 0 | 0 | RADR12 |
| 34 | - | - | INPUT | 0 | 0 | 0 | 0 | RADR13 |
| 48 | (83) | (F) | INPUT | 0 | 0 | 0 | 0 | RADR14 |
| 49 | (84) | (F) | INPUT | 0 | 0 | 0 | 0 | RADR15 |
| 51 | (85) | (F) | INPUT | 0 | 0 | 0 | 0 | RADR16 |
| 61 | (116) | (H) | INPUT | 0 | 0 | 0 | 0 | RADR17 |
| 32 | - | - | INPUT | 0 | 0 | 0 | 0 | RST1 |
| 55 | (99) | (G) | INPUT | 0 | 0 | 0 | 0 | TEST |
| 2 | - | - | INPUT | 0 | 0 | 0 | 0 | ZERO1 |

| | | | | Expanders | | Fan-In | | |
|---|---|---|---|---|---|---|---|---|
| Pin | MCell | LAB | Primitive | Total | Shared | INP | FBK | Name |
| 58 | 113 | H | DFF+ | 2 | 1 | 3 | 6 | CAS_ |
| 12 | 17 | B | NOR2 | 0 | 0 | 1 | 4 | DSP_TA_ |
| 64 | 119 | H | DFF+ | 0 | 0 | 2 | 10 | LW_HPTY |
| 60 | 115 | H | DFF+ | 0 | 0 | 2 | 11 | LW_IRDY |
| 59 | 114 | H | NOT | 0 | 0 | 1 | 9 | LW_ORDY |
| 62 | 117 | H | DFF+ | 14 | 1 | 3 | 23 | RAS_ |
| 52 | 97 | G | NOT | 0 | 0 | 1 | 9 | REF_ON_ |
| 63 | 118 | H | DFF+ | 15 | 0 | 3 | 23 | TRG_ |
| 39 | 66 | E | OR4 | 0 | 0 | 3 | 4 | VADR0 |
| 40 | 67 | E | OR4 | 0 | 0 | 3 | 4 | VADR1 |
| 41 | 68 | E | OR4 | 0 | 0 | 3 | 4 | VADR2 |
| 42 | 69 | E | OR4 | 0 | 0 | 3 | 4 | VADR3 |
| 43 | 70 | E | OR4 | 0 | 0 | 3 | 4 | VADR4 |
| 44 | 71 | E | OR4 | 0 | 0 | 3 | 4 | VADR5 |
| 45 | 72 | E | OR4 | 0 | 0 | 3 | 4 | VADR6 |
| 56 | 100 | G | OR4 | 0 | 0 | 3 | 4 | VADR7 |
| 57 | 101 | G | OR4 | 0 | 0 | 3 | 4 | VADR8 |
| 17 | 21 | B | OR2 | 0 | 0 | 1 | 4 | V_SCLK |
| 53 | 98 | G | NOT | 0 | 0 | 5 | 0 | V_SE |
| 65 | 120 | H | DFF+ | 0 | 0 | 3 | 5 | WEN |

| | | | | Expanders | | Fan-In | | |
|---|---|---|---|---|---|---|---|---|
| Pin | MCell | LAB | Primitive | Total | Shared | INP | FBK | Name |
| - | 48 | C | SOFT | 18 | 0 | 9 | 9 | \|COMP:416\|NEQ |
| - | 96 | F | MCELL | 0 | 0 | 0 | 1 | INIT_ |
| - | 95 | F | SOFT | 0 | 0 | 0 | 4 | \|LWSEQ:557\|REFOFF |
| - | 94 | F | DFF+ | 0 | 0 | 2 | 7 | \|LWSEQ:557\|~22~ |
| - | 93 | F | DFF+ | 0 | 0 | 2 | 6 | \|LWSEQ:557\|~23~ |
| - | 92 | F | DFF+ | 17 | 2 | 2 | 23 | \|LWSEQ:557\|~27~ |
| - | 64 | D | MCELL | 0 | 0 | 0 | 2 | WCRY0 |
| - | 80 | E | MCELL | 0 | 0 | 0 | 9 | WCRY1 |
| - | 47 | C | DFF | 1 | 1 | 1 | 4 | \|8COUNT:119\|QA |
| - | 79 | E | DFF | 1 | 1 | 1 | 5 | \|8COUNT:119\|QB |
| - | 78 | E | DFF | 1 | 1 | 1 | 6 | \|8COUNT:119\|QC |

| | | | | | | | | | |
|---|---|---|---|---|---|---|---|---|---|
| - | 77 | E | DFF | 1 | 1 | 1 | 7 | 8COUNT: 119 | QD |
| - | 76 | E | DFF | 1 | 1 | 1 | 8 | 8COUNT: 119 | QE |
| - | 75 | E | DFF | 1 | 1 | 1 | 9 | 8COUNT: 119 | QF |
| - | 74 | E | DFF | 1 | 1 | 1 | 10 | 8COUNT: 119 | QG |
| - | 73 | E | DFF | 1 | 1 | 1 | 11 | 8COUNT: 119 | QH |
| - | 46 | C | DFF | 0 | 0 | 1 | 4 | 8COUNT: 122 | QA |
| (38) | 65 | E | DFF | 0 | 0 | 1 | 5 | 8COUNT: 122 | QB |
| - | 45 | C | DFF | 0 | 0 | 1 | 6 | 8COUNT: 122 | QC |
| - | 44 | C | DFF | 0 | 0 | 1 | 7 | 8COUNT: 122 | QD |
| - | 43 | C | DFF | 0 | 0 | 1 | 8 | 8COUNT: 122 | QE |
| - | 42 | C | DFF | 0 | 0 | 1 | 9 | 8COUNT: 122 | QF |
| - | 41 | C | DFF | 0 | 0 | 1 | 10 | 8COUNT: 122 | QG |
| - | 40 | C | DFF | 0 | 0 | 1 | 11 | 8COUNT: 122 | QH |
| - | 91 | F | DFF+ | 0 | 0 | 1 | 3 | 8COUNT: 231 | QA |
| - | 90 | F | DFF+ | 0 | 0 | 1 | 4 | 8COUNT: 231 | QB |
| - | 89 | F | DFF+ | 0 | 0 | 1 | 5 | 8COUNT: 231 | QC |
| - | 88 | F | DFF+ | 0 | 0 | 1 | 6 | 8COUNT: 231 | QD |
| - | 87 | F | DFF+ | 0 | 0 | 1 | 7 | 8COUNT: 231 | QE |
| - | 86 | F | DFF+ | 0 | 0 | 1 | 8 | 8COUNT: 231 | QF |
| (51) | 85 | F | DFF+ | 0 | 0 | 1 | 9 | 8COUNT: 231 | QG |
| - | 32 | B | DFF+ | 0 | 0 | 2 | 3 | 8COUNT: 395 | QA |
| - | 31 | B | DFF+ | 0 | 0 | 2 | 4 | 8COUNT: 395 | QB |
| - | 30 | B | DFF+ | 0 | 0 | 2 | 5 | 8COUNT: 395 | QC |
| - | 29 | B | DFF+ | 0 | 0 | 2 | 6 | 8COUNT: 395 | QD |
| - | 28 | B | DFF+ | 0 | 0 | 2 | 7 | 8COUNT: 395 | QE |
| - | 27 | B | DFF+ | 0 | 0 | 2 | 8 | 8COUNT: 395 | QF |
| - | 26 | B | DFF+ | 0 | 0 | 2 | 9 | 8COUNT: 395 | QG |
| - | 25 | B | DFF+ | 0 | 0 | 2 | 10 | 8COUNT: 395 | QH |
| - | 112 | G | DFF+ | 0 | 0 | 1 | 1 | 8COUNT: 578 | QA |
| - | 111 | G | DFF+ | 0 | 0 | 1 | 2 | 8COUNT: 578 | QB |
| - | 110 | G | DFF+ | 0 | 0 | 1 | 3 | 8COUNT: 578 | QC |
| - | 109 | G | DFF+ | 0 | 0 | 1 | 4 | 8COUNT: 578 | QD |
| - | 108 | G | DFF+ | 0 | 0 | 1 | 5 | 8COUNT: 578 | QE |
| - | 107 | G | DFF+ | 0 | 0 | 1 | 6 | 8COUNT: 578 | QF |
| - | 106 | G | DFF+ | 0 | 0 | 1 | 7 | 8COUNT: 578 | QG |
| - | 105 | G | DFF+ | 0 | 0 | 1 | 8 | 8COUNT: 578 | QH |
| - | 63 | D | MCELL | 0 | 0 | 0 | 1 | :496 | |
| - | 62 | D | DFF | 0 | 0 | 1 | 5 | 7474: 217 | 1Q |
| (48) | 83 | F | DFF+ | 0 | 0 | 1 | 1 | 7474: 233 | 1Q |
| - | 24 | B | DFF+ | 0 | 0 | 1 | 2 | 7474: 233 | 2Q |
| - | 61 | D | DFF | 0 | 0 | 1 | 2 | 7474: 360 | 1Q |
| - | 128 | H | DFF+ | 0 | 0 | 1 | 3 | 7474: 360 | 2Q |
| - | 60 | D | DFF | 1 | 1 | 4 | 4 | 7474: 417 | 1Q |
| (47) | 82 | F | DFF+ | 0 | 0 | 1 | 10 | 7474: 417 | 2Q |
| - | 39 | C | DFF | 0 | 0 | 1 | 11 | 7474: 421 | 1Q |
| (46) | 81 | F | DFF+ | 0 | 0 | 2 | 0 | 7474: 421 | 2Q |
| - | 59 | D | DFF | 0 | 0 | 0 | 2 | 7474: 507 | 1Q |
| - | 58 | D | DFF | 2 | 1 | 4 | 11 | 7474: 508 | 1Q |
| - | 127 | H | DFF+ | 0 | 0 | 1 | 1 | 7474: 508 | 2Q |
| - | 57 | D | DFF | 2 | 1 | 4 | 6 | 7474: 516 | 1Q |
| - | 23 | B | DFF+ | 0 | 0 | 1 | 1 | 7474: 516 | 2Q |
| - | 22 | B | DFF+ | 0 | 0 | 1 | 1 | 7474: 537 | 1Q |
| - | 16 | A | DFF | 1 | 0 | 0 | 10 | 7474: 581 | 1Q |
| - | 104 | G | DFF+ | 0 | 0 | 1 | 8 | 7474: 581 | 2Q |
| (31) | 56 | D | DFF | 0 | 0 | 1 | 2 | 7476: 598 | 1Q |
| (30) | 55 | D | DFF | 0 | 0 | 1 | 3 | 74161: 46 | QA |
| (29) | 54 | D | DFF | 0 | 0 | 1 | 4 | 74161: 46 | QB |
| (15) | 20 | B | DFF+ | 0 | 0 | 1 | 1 | 74164: 551 | QA |
| (14) | 19 | B | DFF+ | 0 | 0 | 1 | 1 | 74164: 551 | QB |
| (13) | 18 | B | DFF+ | 0 | 0 | 1 | 1 | 74164: 551 | QC |
| (28) | 53 | D | DFF | 0 | 0 | 1 | 2 | 74273: 457 | :12 |
| - | 38 | C | DFF | 0 | 0 | 1 | 2 | 74273: 458 | :12 |
| (23) | 37 | C | DFF | 0 | 0 | 1 | 2 | 74273: 458 | :13 |
| (22) | 36 | C | DFF | 0 | 0 | 1 | 2 | 74273: 458 | :14 |
| (18) | 33 | C | DFF | 0 | 0 | 1 | 2 | 74273: 458 | :15 |
| (27) | 52 | D | DFF | 0 | 0 | 1 | 2 | 74273: 458 | :16 |

```
(26)   51   D   DFF   0   0   1   2   |74273:458|:17
(19)   34   C   DFF   0   0   1   2   |74273:458|:18
(21)   35   C   DFF   0   0   1   2   |74273:458|:19
```

Logic Array Block "A":

```
          M
          C
          1
          6
          | | A B C D E F G H | Name
MC16  ->  - | @ - - - - * - * | |7474:581|1Q

@1    ->  - | - * - - - * * * | CLK1
@68   ->  - | - - * * * - - - | RADR9
@66   ->  - | - - * - * - - - | RADR10
@36   ->  - | - - * - * - - - | RADR11
@35   ->  - | - - * * * - - - | RADR12
@34   ->  - | - - * * * - - - | RADR13
@32   ->  - | - - - - - * - * | RST1
@2    ->  - | - - * * * - - - | ZERO1
MC95  ->  * | * - - - - @ - - |  |LWSEQ:557|REFOFF
MC112->   * | * - - - - - @ - |  |8COUNT:578|QA
MC111->   * | * - - - - - @ - |  |8COUNT:578|QB
MC110->   * | * - - - - - @ - |  |8COUNT:578|QC
MC109->   * | * - - - - - @ - |  |8COUNT:578|QD
MC108->   * | * - - - - - @ - |  |8COUNT:578|QE
MC107->   * | * - - - - - @ - |  |8COUNT:578|QF
MC106->   * | * - - - - - @ - |  |8COUNT:578|QG
MC105->   * | * - - - - - @ - |  |8COUNT:578|QH
MC104->   * | * - - - - - @ - |  |7474:581|2Q
```

Logic Array Block "B":

```
          M M M M M M M M M M M M M M M M
          C C C C C C C C C C C C C C C C
          1 2 3 3 3 2 2 2 2 2 2 2 2 2 1 1
          7 1 2 1 0 9 8 7 6 5 4 3 2 0 9 8
          | | | | | | | | | | | | | | | | | A B C D E F G H | Name
MC17  ->  - - - - - - - - - - - - - - - - | - @ - - - - - - | DSP_TA_
MC21  ->  - - - - - - - - - - - - - - - - | - @ - - - - - - | V_SCLK_
MC32  ->  - - * * * * * * * * - - - - - - | - @ - * - - - - |  |8COUNT:395|QA
MC31  ->  - - - * * * * * * * - - - - - - | - @ - * - - - - |  |8COUNT:395|QB
MC30  ->  - - - - * * * * * * - - - - - - | - @ - * - - - - |  |8COUNT:395|QC
MC29  ->  - - - - - * * * * * - - - - - - | - @ - * - - - - |  |8COUNT:395|QD
MC28  ->  - - - - - - * * * * - - - - - - | - @ - * - - - - |  |8COUNT:395|QE
MC27  ->  - - - - - - - * * * - - - - - - | - @ - * - - - - |  |8COUNT:395|QF
MC26  ->  - - - - - - - - * * - - - - - - | - @ - * - - - - |  |8COUNT:395|QG
MC25  ->  - - - - - - - - - * - - - - - - | - @ - * - - - - |  |8COUNT:395|QH
MC24  ->  - - - - - - - - - - - - - - - - | - @ - - - * - * |  |7474:233|2Q
MC23  ->  * * - - - - - - - - - * - - - - | - @ - * - - - - |  |7474:516|2Q
MC22  ->  * * - - - - - - - - - - - - - - | - @ - - - - - - |  |7474:537|1Q
MC20  ->  * - * * * * * * * * - - - - * - | - @ - * - - - - |  |74164:551|QA
MC19  ->  * - - - - - - - - - - - - - - * | - @ - - - - - - |  |74164:551|QB
MC18  ->  - - - - - - - - - - * - - - - - | - @ - - - - - - |  |74164:551|QC

@13   ->  * * - - - - - - - - - - - - - - | - @ - - * - * * | ATE
@1    ->  - - * * * * * * * * * * * * * * | - * - - - * * * | CLK1
@5    ->  - - * - - - - - - - - - - - - - | @ * - - - - - - | DSP_D0
@6    ->  - - - * - - - - - - - - - - - - | @ * - - - - - - | DSP_D1
@7    ->  - - - - * - - - - - - - - - - - | @ * - - - - - - | DSP_D2
@8    ->  - - - - - * - - - - - - - - - - | @ * - - - - - - | DSP_D3
@9    ->  - - - - - - * - - - - - - - - - | @ * - - - - - - | DSP_D4
@10   ->  - - - - - - - * - - - - - - - - | @ * - - - - - - | DSP_D5
@11   ->  - - - - - - - - * - - - - - - - | @ * - - - - - - | DSP_D6
@24   ->  - - - - - - - - - * - - - - - - | - * - @ - - - - | DSP_D7
```

```
@68   -> - - - - - - - - - - - - - - - - | - - * * * - - - | RADR̄9
@66   -> - - - - - - - - - - - - - - - - | - - * - * - - - | RADR10
@36   -> - - - - - - - - - - - - - - - - | - - * - * - - - | RADR11
@35   -> - - - - - - - - - - - - - - - - | - - * * * - - - | RADR12
@34   -> - - - - - - - - - - - - - - - - | - - * * * - - - | RADR13
@32   -> - - - - - - - - - - - - - - - - | - - - - - * - * | RST1
@2    -> - - - - - - - - - - - - - - - - | - - * * * - - - | ZERO1
MC96  -> - * * * * * * * * * - - - - - - | - * * * * @ - * | INIT_
MC94  -> - * - - - - - - - - - - - - - - | - * * * * @ - * | |LWSĒQ: 557|-22-
MC127 -> - - * * * * * * * * * - - * - - | - * - * - - - @ | |7474: 508|2Q
MC57  -> - - - - - - - - - - - * - - - - | - * - @ - - - - | |7474: 516|1Q
```

Logic Array Block "C":

```
         M M M M M M M M M M M M M M M M
         C C C C C C C C C C C C C C C C
         4 4 4 4 4 4 4 4 4 3 3 3 3 3 3 3
         8 7 6 5 4 3 2 1 0 9 8 7 6 3 4 5
         | | | | | | | | | | | | | | | | | A B C D E F G H | Name
MC48  -> - - - - - - - - - - - - - - - - | - - @ * - - - - | |COMP: 416|NEQ
MC47  -> - * - - - - - - - * - - - - - - | - - @ - * - - - | |8COUNT: 119|QA
MC46  -> - - * * * * * * * - - - - - - - | - - @ - * - - - | |8COUNT: 122|QA
MC45  -> - - - * * * * * * - - - - - - - | - - @ - * - - - | |8COUNT: 122|QC
MC44  -> - - - - * * * * * - - - - - - - | - - @ - * - - - | |8COUNT: 122|QD
MC43  -> - - - - - * * * * - - - - - - - | - - @ - * - - - | |8COUNT: 122|QE
MC42  -> - - - - - - * * * - - - - - - - | - - @ - * - - - | |8COUNT: 122|QF
MC41  -> - - - - - - - * * - - - - - - - | - - @ - - - * - | |8COUNT: 122|QG
MC40  -> - - - - - - - - * - - - - - - - | - - @ - - - * - | |8COUNT: 122|QH
MC39  -> - - - - - - - - - - - - - - - - | - - @ - - * - * | |7474: 421|1Q
MC38  -> * - - - - - - - - - - - - - - - | - - @ - - - - - | |74273: 458|: 12
MC37  -> * - - - - - - - - - - - - - - - | - - @ - - - - - | |74273: 458|: 13
MC36  -> * - - - - - - - - - - - - - - - | - - @ - - - - - | |74273: 458|: 14
MC33  -> * - - - - - - - - - - - - - - - | - - @ - - - - - | |74273: 458|: 15
MC34  -> * - - - - - - - - - - - - - - - | - - @ - - - - - | |74273: 458|: 18
MC35  -> * - - - - - - - - - - - - - - - | - - @ - - - - - | |74273: 458|: 19

@1    -> - - - - - - - - - - - - - - - - | - * - - - * * * | CLK1
@68   -> * - - - - - - - - - - - - - - - | - - * * * - - - | RADR9
@66   -> * - - - - - - - - - - - - - - * | - - * - * - - - | RADR10
@36   -> * - - - - - - - - - - - - - * - | - - * - * - - - | RADR11
@35   -> * - - - - - - - - - - - - - - - | - - * * * - - - | RADR12
@34   -> * - - - - - - - - - - - - - - - | - - * * * - - - | RADR13
@48   -> * - - - - - - - - - - - - * - - | - - * - * @ - - | RADR14
@49   -> * - - - - - - - - - - - * - - - | - - * - * @ - - | RADR15
@51   -> * - - - - - - - - - - * - - - - | - - * - - @ * - | RADR16
@61   -> * - - - - - - - - - * - - - - - | - - * - - - * @ | RADR17
@32   -> - - - - - - - - - - - - - - - - | - - - - - * - * | RST1
@2    -> - * * * * * * * * * - - - - - - | - - * * * - - - | ZERO1
MC96  -> - * * * * * * * * - * * * * * * | - * * * * @ - * | INIT_
MC94  -> - * * * * * * * * * - - - - - - | - * * * * @ - * | |LWSĒQ: 557|-22-
MC92  -> - - - - - - - - - * - - - - - - | - - * - * @ * * | |LWSEQ: 557|-27-
MC64  -> - * - - - - - - - * - - - - - - | - - * @ * - - - | WCRY0
MC80  -> - - * * * * * * * - - - - - - - | - - * * @ - - - | WCRY1
MC79  -> - - - - - - - - - * - - - - - - | - - * - @ - - - | |8COUNT: 119|QB
MC78  -> - - - - - - - - - * - - - - - - | - - * - @ - - - | |8COUNT: 119|QC
MC77  -> - - - - - - - - - * - - - - - - | - - * - @ - - - | |8COUNT: 119|QD
MC76  -> - - - - - - - - - * - - - - - - | - - * - @ - - - | |8COUNT: 119|QE
MC75  -> - - - - - - - - - * - - - - - - | - - * - @ - * - | |8COUNT: 119|QF
MC74  -> - - - - - - - - - * - - - - - - | - - * - @ - * - | |8COUNT: 119|QG
MC65  -> - - - * * * * * * - - - - - - - | - - * - @ - - - | |8COUNT: 122|QB
MC60  -> - - - - - - - - - - * * * * * * | - - * @ - * - - | |7474: 417|1Q
MC56  -> - * * * * * * * * * - - - - - - | - - * @ * - - - | |7476: 598|1Q
MC53  -> * - - - - - - - - - - - - - - - | - - * @ - - - - | |74273: 457|: 12
MC52  -> * - - - - - - - - - - - - - - - | - - * @ - - - - | |74273: 458|: 16
MC51  -> * - - - - - - - - - - - - - - - | - - * @ - - - - | |74273: 458|: 17
```

Logic Array Block "D":

```
          M M M M M M M M M M M M M M
          C C C C C C C C C C C C C C
          6 6 6 6 6 5 5 5 5 5 5 5 5 5
          4 3 2 1 0 9 8 7 6 5 4 3 2 1
          | | | | | | | | | | | | | |   | A B C D E F G H | Name
MC64  ->  - - - - - - - - - - - - - -   | - - * @ * - - - | WCRY0
MC63  ->  - - * - - - - - - - - - - -   | - - - @ - - - - | :496
MC62  ->  - - - - - - - - - - - - - -   | - - - @ - * - * | |7474:217|1Q
MC61  ->  - - - - - - - - - - - - - -   | - - - @ - - - * | |7474:360|1Q
MC60  ->  - - - - - * - - - - - * * *   | - - * @ - * - - | |7474:417|1Q
MC59  ->  - - - - * - - * - - - - - -   | - - - @ - - - - | |7474:507|1Q
MC58  ->  - - - - - - - - - - - - - -   | - - - @ - * - * | |7474:508|1Q
MC57  ->  - - - - - - - - - - - - - -   | - * - @ - - - - | |7474:516|1Q
MC56  ->  - - * - - - - - * * * - - -   | - - * @ * - - - | |7476:598|1Q
MC55  ->  * - - - - - - - - * * - - -   | - - - @ * - - - | |74161:46|QA
MC5., ->  * - - - - - - - - - * - - -   | - - - @ * - - - | |74161:46|QB
MC53  ->  - - - - - - - - - - - - - -   | - - * @ - - - - | |74273:457|:12
MC52  ->  - - - - - - - - - - - - - -   | - - * @ - - - - | |74273:458|:16
MC51  ->  - - - - - - - - - - - - - -   | - - * @ - - - - | |74273:458|:17

@1    ->  - - - - - - - - - - - - - -   | - * - - - * * * | CLK1
@4    ->  - - - - * - * * - - - - - -   | @ - - * - - * - | DSP_A18
@25   ->  - - - - * - * * - - - - - -   | - - - @ - - * - | DSP_RW
@26   ->  - - - - * - * * - - - - - -   | - - - @ - - * - | DSP_TS
@27   ->  - - - * - - - - - - - - - -   | - - - @ - - - - | HOST_SI
@68   ->  - - - - - - - - - - - * - -   | - - * * * - - - | RADR9
@66   ->  - - - - - - - - - - - - - -   | - - * - * - - - | RADR10
@36   ->  - - - - - - - - - - - - - -   | - - * - * - - - | RADR11
@35   ->  - - - - - - - - - - - - - *   | - - * * * - - - | RADR12
@34   ->  - - - - - - - - - - - - * -   | - - * * * - - - | RADR13
@32   ->  - - - - - - - - - - - - - -   | - - - - - * - * | RS11
@55   ->  - - - - * - * * - - - - - -   | - - - * - - @ - | TEST
@2    ->  - - * - - - - - * * * - - -   | - - * * * - - - | ZERO1
MC113 ->  - - - - - - - * - - - - - -   | - - - * - * - @ | CAS
MC48  ->  - - - - * - - * - - - - - -   | - - @ * - - - - | |COMP:416|NEQ
MC96  ->  - - * * * * * * * * * * * *   | - * * * * @ - * | INIT
MC94  ->  - - * * - - - - * * * - - -   | - * * * * @ - * | |LWSEQ:557|~22~
MC118 ->  - - - - * - - * - - - - - -   | - - - * * * * @ | TRG
MC80  ->  - - * - - - - - - - - - - -   | - - * * @ - - - | WCRY1
MC32  ->  - - - - - - * - - - - - - -   | - @ - * - - - - | |8COUNT:395|QA
MC31  ->  - - - - - - * - - - - - - -   | - @ - * - - - - | |8COUNT:395|QB
MC30  ->  - - - - - - * - - - - - - -   | - @ - * - - - - | |8COUNT:395|QC
MC29  ->  - - - - - - * - - - - - - -   | - @ - * - - - - | |8COUNT:395|QD
MC28  ->  - - - - - - * - - - - - - -   | - @ - * - - - - | |8COUNT:395|QE
MC27  ->  - - - - - - * - - - - - - -   | - @ - * - - - - | |8COUNT:395|QF
MC26  ->  - - - - - - * - - - - - - -   | - @ - * - - - - | |8COUNT:395|QG
MC25  ->  - - - - - - * - - - - - - -   | - @ - * - - - - | |8COUNT:395|QH
MC83  ->  - * - - - - - - - - - - - -   | - - - * - @ - * | |7474:233|1Q
MC127 ->  - - - - - - * - - - - - - -   | - * - * - - - @ | |7474:508|2Q
MC23  ->  - - - - - - - * - - - - - -   | - @ - * - - - - | |7474:516|2Q
MC20  ->  - - - - - - * - - - - - - -   | - @ - * - - - - | |74164:551|QA
```

Logic Array Block "E":

```
          M M M M M M M M M M M M M M M M
          C C C C C C C C C C C C C C C C
          6 6 6 6 7 7 7 8 7 7 7 7 7 7 7 6
          6 7 8 9 0 1 2 0 9 8 7 6 5 4 3 5
          | | | | | | | | | | | | | | | |   | A B C D E F G H | Name
MC66  ->  - - - - - - - - - - - - - - - -   | - - - - @ - - - | VADR0
MC67  ->  - - - - - - - - - - - - - - - -   | - - - - @ - - - | VADR1
MC68  ->  - - - - - - - - - - - - - - - -   | - - - - @ - - - | VADR2
MC69  ->  - - - - - - - - - - - - - - - -   | - - - - @ - - - | VADR3
MC70  ->  - - - - - - - - - - - - - - - -   | - - - - @ - - - | VADR4
MC71  ->  - - - - - - - - - - - - - - - -   | - - - - @ - - - | VADR5
```

```
MC72 -> - - - - - - - - - - - - - - - - | - - - - @ - - - | VADR6
MC80 -> - - - - - - - - - - - - - - - * | - - * * @ - - - | WCRY1
MC79 -> - - - * - - - * * * * * * * * - | - - * - @ - - - | |8COUNT: 119 |QB
MC78 -> - - - - * - - * - * * * * * * - | - - * - @ - - - | |8COUNT: 119 |QC
MC77 -> - - - - - * - * - - * * * * * - | - - * - @ - - - | |8COUNT: 119 |QD
MC76 -> - - - - - - * * - - - * * * * - | - - * - @ - - - | |8COUNT: 119 |QE
MC75 -> - - - - - - - * - - - - * * * - | - - * - @ - * - | |8COUNT: 119 |QF
MC74 -> - - - - - - - * - - - - - * * - | - - * - @ - * - | |8COUNT: 119 |QG
MC73 -> * - - - - - - * - - - - - - * - | - - - - @ - - - | |8COUNT: 119 |QH
MC65 -> - - * - - - - - - - - - - - - * | - - * - @ - - - | |8COUNT: 122 |QB

@13  -> * * * * * * * - - - - - - - - - | - @ - - * - * * | ATE
@1   -> - - - - - - - - - - - - - - - - | - * - - - * * * | CLK1
@29  -> * - - - - - - - - - - - - - - - | - - - @ * - - - | RADR0
@30  -> - * - - - - - - - - - - - - - - | - - - @ * - - - | RADR1
@31  -> - - * - - - - - - - - - - - - - | - - - @ * - - - | RADR2
@14  -> - - - * - - - - - - - - - - - - | - @ - - * - - - | RADR3
@15  -> - - - - * - - - - - - - - - - - | - @ - - * - - - | RADR4
@38  -> - - - - - * - - - - - - - - - - | - - - - @ - - - | RADR5
@22  -> - - - - - - * - - - - - - - - - | - - @ - * - - - | RADR6
@68  -> * - - - - - - - - - - - - - - - | - - * * * - - - | RADR9
@66  -> - * - - - - - - - - - - - - - - | - - * - * - - - | RADR10
@36  -> - - * - - - - - - - - - - - - - | - - * - * - - - | RADR11
@35  -> - - - * - - - - - - - - - - - - | - - * * * - - - | RADR12
@34  -> - - - - * - - - - - - - - - - - | - - * * * - - - | RADR13
@48  -> - - - - - * - - - - - - - - - - | - - * - * @ - - | RADR14
@49  -> - - - - - - * - - - - - - - - - | - - * - * @ - - | RADR15
@32  -> - - - - - - - - - - - - - - - - | - - - - - * - * | RST1
@2   -> - - - - - - - - * * * * * * * * | - - * * * - - - | ZERO1
MC96 -> - - - - - - - - * * * * * * * * | - * * * * @ - * | INIT_
MC94 -> - - - - - - - - * * * * * * * * | - * * * * @ - * | |LWSEQ: 557 |-22-
MC92 -> * * * * * * * - - - - - - - - - | - - * - * @ * * | |LWSEQ: 557 |-27-
MC118-> * * * * * * * - - - - - - - - - | - - - * * * * @ | TRG
MC64 -> - - - - - - - * * * * * * * * - | - - * @ * - - - | WCRY0
MC47 -> - - * - - - - * * * * * * * * - | - - @ - * - - - | |8COUNT: 119 |QA
MC46 -> - * - - - - - - - - - - - - - * | - - @ - * - - - | |8COUNT: 122 |QA
MC45 -> - - - * - - - - - - - - - - - - | - - @ - * - - - | |8COUNT: 122 |QC
MC44 -> - - - - * - - - - - - - - - - - | - - @ - * - - - | |8COUNT: 122 |QD
MC43 -> - - - - - * - - - - - - - - - - | - - @ - * - - - | |8COUNT: 122 |QE
MC42 -> - - - - - - * - - - - - - - - - | - - @ - * - - - | |8COUNT: 122 |QF
MC56 -> - - - - - - - - * * * * * * * * | - - * @ * - - - | |7476: 598 |1Q
MC55 -> * - - - - - - - - - - - - - - - | - - - @ * - - - | |74161: 46 |QA
MC54 -> - * - - - - - - - - - - - - - - | - - - @ * - - - | |74161: 46 |QB
```

Logic Array Block "F":

```
        M M M M M M M M M M M M M M M
        C C C C C C C C C C C C C C C
        9 9 9 9 9 9 9 8 8 8 8 8 8 8 8
        6 5 4 3 2 1 0 9 8 7 6 5 3 2 1
        | | | | | | | | | | | | | | |   | A B C D E F G H | Name
MC96 -> - - - - - * * * * * * * - - - | - * * * * @ - * | INIT_
MC95 -> - - - - - - - - - - - - - - - | * - - - - @ - - | |LWSEQ: 557 |REFOFF
MC94 -> - * * * * - - - - - - - - - - | - * * * * @ - * | |LWSEQ: 557 |-22-
MC93 -> * * * * * - - - - - - - - - - | - - - - - @ - * | |LWSEQ: 557 |-23-
MC92 -> - - * * * - - - - - - - - - - | - - * - * @ * * | |LWSEQ: 557 |-27-
MC91 -> - - - - * * * * * * * * - * - | - - - - - @ - * | |8COUNT: 231 |QA
MC90 -> - - - - * - * * * * * * - * - | - - - - - @ - * | |8COUNT: 231 |QB
MC89 -> - - - - * - - * * * * * - * - | - - - - - @ - * | |8COUNT: 231 |QC
MC88 -> - - - - * - - - * * * * - * - | - - - - - @ - * | |8COUNT: 231 |QD
MC87 -> - - - - * - - - - * * * - * - | - - - - - @ - * | |8COUNT: 231 |QE
MC86 -> - - - - * - - - - - * * - * - | - - - - - @ - * | |8COUNT: 231 |QF
MC85 -> - - - - * - - - - - - * - * - | - - - - - @ - * | |8COUNT: 231 |QG
MC83 -> - - - - * * * * * * * * * - - | - - - * - @ - * | |7474: 233 |1Q
MC82 -> - - - - * - - - - - - - - - - | - - - - - @ - * | |7474: 417 |2Q
MC81 -> - - * - - - - - - - - - - - - | - - - - - @ - * | |7474: 421 |2Q
```

```
@1    -> - - * * * * * * * * * * * * * | - * - - - * * * | CLK1
@28   -> - - - - - - - - - - - - - - * | - - - @ - * - - | LOAD1
@68   -> - - - - - - - - - - - - - - - | - - * * * - - - | RADR9
@66   -> - - - - - - - - - - - - - - - | - - * - * - - - | RADR10
@36   -> - - - - - - - - - - - - - - - | - - * - * - - - | RADR11
@35   -> - - - - - - - - - - - - - - - | - - * * * - - - | RADR12
@34   -> - - - - - - - - - - - - - - - | - - * * * - - - | RADR13
@32   -> - - * * * - - - - - - - - - - | - - - - - * - * | RST1
@2    -> - - - - - - - - - - - - - - - | - - * * * - - - | ZERO1
MC113-> - * * * * - - - - - - - - - - | - - - * - * - @ | CAS_
MC119-> - - - - * - - - - - - - - * - | - - - - - * - @ | LW_HPTY
MC115-> - - - - * - - - - - - - - * - | - - - - - * - @ | LW_IRDY
MC117-> - * * * * - - - - - - - - - - | - - - - - * - @ | RAS_
MC118-> - - * * * - - - - - - - - - - | - - - * * * * @ | TRG_
MC120-> - - * * * - - - - - - - - - - | - - - - - * - @ | WEN
MC62 -> - - - - * - - - - - - - * - - | - - - @ - * - * |  |7474:217|1Q
MC24 -> - - - - * * * * * * * * - - - | - @ - - - * - * |  |7474:233|2Q
MC128-> - - - - * - - - - - - - - - - | - - - - - * - @ |  |7474:360|2Q
MC60 -> - - - - - - - - - - - - - * - | - - * @ - * - - |  |7474:417|1Q
MC39 -> - - - - * - - - - - - - - - - | - - @ - - * - * |  |7474:421|1Q
MC58 -> - - - - * - - - - - - - - - - | - - - @ - * - * |  |7474:508|1Q
MC16 -> - - - - * - - - - - - - - - - | @ - - - - * - * |  |7474:581|1Q
```

Logic Array Block "G":

```
         M M M M M M M M M M M M M
         C C C C C C C C C C C C C
         9 1 1 9 1 1 1 1 1 1 1 1 1
         7 0 0 8 1 1 1 0 0 0 0 0 0
         | 0 1 | 2 1 0 9 8 7 6 5 4 | A B C D E F G H | Name
MC97 -> - - - - - - - - - - - - - | - - - - - - @ - | REF_ON_
MC100-> - - - - - - - - - - - - - | - - - - - - @ - | VADR7
MC101-> - - - - - - - - - - - - - | - - - - - - @ - | VADR8
MC98 -> - - - - - - - - - - - - - | - - - - - - @ - | V_SE
MC112-> * - - - * * * * * * * * * | * - - - - - @ - |  |8COUNT:578|QA
MC111-> * - - - - * * * * * * * * | * - - - - - @ - |  |8COUNT:578|QB
MC110-> * - - - - - * * * * * * * | * - - - - - @ - |  |8COUNT:578|QC
MC109-> * - - - - - - * * * * * * | * - - - - - @ - |  |8COUNT:578|QD
MC108-> * - - - - - - - * * * * * | * - - - - - @ - |  |8COUNT:578|QE
MC107-> * - - - - - - - - * * * * | * - - - - - @ - |  |8COUNT:578|QF
MC106-> * - - - - - - - - - * * * | * - - - - - @ - |  |8COUNT:578|QG
MC105-> * - - - - - - - - - - * * | * - - - - - @ - |  |8COUNT:578|QH
MC104-> * - - - * * * * * * * * * | * - - - - - @ - |  |7474:581|2Q

@13   -> * * * * - - - - - - - - - | - @ - - * - * * | ATE
@1    -> - - - - * * * * * * * * * | - * - - - * * * | CLK1
@4    -> - - - * - - - - - - - - - | @ - - * - - * - | DSP_A18
@25   -> - - - * - - - - - - - - - | - - - @ - - * - | DSP_RW
@26   -> - - - * - - - - - - - - - | - - - @ - - * - | DSP_TS
@23   -> - * - - - - - - - - - - - | - - @ - - - * - | RADR7
@47   -> - - * - - - - - - - - - - | - - - - - @ * - | RADR8
@68   -> - - - - - - - - - - - - - | - - * * * - - - | RADR9
@66   -> - - - - - - - - - - - - - | - - * - * - - - | RADR10
@36   -> - - - - - - - - - - - - - | - - * - * - - - | RADR11
@35   -> - - - - - - - - - - - - - | - - * * * - - - | RADR12
@34   -> - - - - - - - - - - - - - | - - * * * - - - | RADR13
@51   -> - * - - - - - - - - - - - | - - * - - @ * - | RADR16
@61   -> - - * - - - - - - - - - - | - - * - - - * @ | RADR17
@32   -> - - - - - - - - - - - - - | - - - - - * - * | RST1
@55   -> - - - * - - - - - - - - - | - - - * - - @ - | TEST
@2    -> - - - - - - - - - - - - - | - - * * * - - - | ZERO1
MC92 -> - * * - - - - - - - - - - | - - * - * @ * * | |LWSEQ:557|-27-
MC118-> - * * - - - - - - - - - - | - - - * * * * @ | TRG
MC75 -> - * - - - - - - - - - - - | - - * - @ - * - |  |8COUNT:119|QF
MC74 -> - - * - - - - - - - - - - | - - * - @ - * - |  |8COUNT:119|QG
MC41 -> - * - - - - - - - - - - - | - - @ - - - * - |  |8COUNT:122|QG
MC40 -> - - * - - - - - - - - - - | - - @ - - - * - |  |8COUNT:122|QH
```

```
Logic Array Block "H":

        M M M M M M M M M
        C C C C C C C C C
        1 1 1 1 1 1 1 1 1
        1 1 1 1 1 1 2 2 2
        3 9 5 4 7 8 0 8 7 | A B C D E F G H | Name
MC113-> * - - - * * * - - | - - - * - * - @ | CAS_
MC119-> - * * * * * - - - | - - - - - * - @ | LW_HPTY
MC115-> - - * * * * - - - | - - - - - * - @ | LW_IRDY
MC114-> - - - - - - - - - | - - - - - - - @ | LW_ORDY
MC117-> * - - - * * * - - | - - - - - * - @ | RAS_
MC118-> * - - - * * * - - | - - - * * * * @ | TRG_
MC120-> * - - - * * * - - | - - - - - * - @ | WEN
MC128-> - - - - * * - - - | - - - - - * - @ |  |7474: 360|2Q
MC127-> - - - - - - - - - | - * - * - - - @ |  |7474: 508|2Q

@13   -> * * * * * * * -   | - @ - - * - * * | ATE
@1    -> * * * - * * * * * | - * - - - * * * | CLK1
@68   -> - - - - - - - - - | - - * * * - - - | RADR9
@66   -> - - - - - - - - - | - - * - * - - - | RADR10
@36   -> - - - - - - - - - | - - * - * - - - | RADR11
@35   -> - - - - - - - - - | - - * * * - - - | RADR12
@34   -> - - - - - - - - - | - - * * * - - - | RADR13
@32   -> * - - - * * * - - | - - - - - * - * | RST1
@2    -> - - - - - - - - - | - - * * * - - - | ZERO1
MC96  -> - * * - - - - * - | - * * * * @ - * | INIT_
MC94  -> * - - - * * * * - | - * * * * @ - * |  |LWSEQ: 557|-22-
MC93  -> * - - - * * * - - | - - - - - @ - * |  |LWSEQ: 557|-23-
MC92  -> * - - - * * * - - | - - * - * @ * * |  |LWSEQ: 557|-27-
MC91  -> - * * * * * - - - | - - - - - @ - * |  |8COUNT: 231|QA
MC90  -> - * * * * * - - - | - - - - - @ - * |  |8COUNT: 231|QB
MC89  -> - * * * * * - - - | - - - - - @ - * |  |8COUNT: 231|QC
MC88  -> - * * * * * - - - | - - - - - @ - * |  |8COUNT: 231|QD
MC87  -> - * * * * * - - - | - - - - - @ - * |  |8COUNT: 231|QE
MC86  -> - * * * * * - - - | - - - - - @ - * |  |8COUNT: 231|QF
MC85  -> - * * * * * - - - | - - - - - @ - * |  |8COUNT: 231|QG
MC62  -> - - - - * * - - - | - - - @ - * - * |  |7474: 217|1Q
MC83  -> - * * - * * - - - | - - - * - @ - * |  |7474: 233|1Q
MC24  -> - * * - * * - - - | - @ - - - * - * |  |7474: 233|2Q
MC61  -> - - - - - - - * - | - - - @ - - - * |  |7474: 360|1Q
MC82  -> - - - - * * - - - | - - - - - @ - * |  |7474: 417|2Q
MC39  -> - - - - * * - - - | - - @ - - * - * |  |7474: 421|1Q
MC81  -> - - - - - * - - - | - - - - - @ - * |  |7474: 421|2Q
MC58  -> - - - - * * - - * | - - - @ - * - * |  |7474: 508|1Q
MC16  -> - - - - * - - - - | @ - - - - * - * |  |7474: 581|1Q
```

```
** EQUATIONS **

DSP_RW    : INPUT;
DSP_TS    : INPUT;
TEST      : INPUT;
DSP_A18   : INPUT;
ATE       : INPUT;
HOST_SI   : INPUT;
LOAD1     : INPUT;
CLK1      : INPUT;
RST1      : INPUT;
DSP_D0    : INPUT;
DSP_D1    : INPUT;
DSP_D2    : INPUT;
DSP_D3    : INPUT;
DSP_D4    : INPUT;
DSP_D5    : INPUT;
DSP_D6    : INPUT;
DSP_D7    : INPUT;
ZERO1     : INPUT;
```

```
RADR9    : INPUT;
RADR10   : INPUT;
RADR11   : INPUT;
RADR12   : INPUT;
RADR13   : INPUT;
RADR14   : INPUT;
RADR15   : INPUT;
RADR16   : INPUT;
RADR17   : INPUT;
RADR8    : INPUT;
RADR4    : INPUT;
RADR5    : INPUT;
RADR7    : INPUT;
RADR6    : INPUT;
RADR2    : INPUT;
RADR3    : INPUT;
RADR1    : INPUT;
RADR0    : INPUT;

% |7474:581|1Q %
 _MC016  = DFF( GND $ GND, GND, _MC095, _EQ001 );
  _EQ001 =  _X001;
  _X001  = EXP( !_MC104 & !_MC105 & !_MC106 & !_MC107 & !_MC108 & !_MC109 &
              !_MC110 & !_MC111 & !_MC112 );

DSP_TA_  = TRI( _MC017, !ATE);
 _MC017  = MCELL( _EQ002 $ VCC );
  _EQ002 = !_MC022 & _MC023
         # _MC019 & !_MC020;

% |74164:551|QC %
 _MC018  = DFF( _MC019 $ GND, SCLK( CLK1 ), VCC, VCC );

% |74164:551|QB %
 _MC019  = DFF( _MC020 $ GND, SCLK( CLK1 ), VCC, VCC );

% |74164:551|QA %
 _MC020  = DFF( _MC127 $ GND, SCLK( CLK1 ), VCC, VCC );
V_SCLK   = TRI( _MC021, !ATE);
 _MC021  = MCELL( _EQ003 $ GND );
  _EQ003 = !INIT_ & _MC094
         # !_MC022 & _MC023;

% |7474:537|1Q %
 _MC022  = DFF( _MC023 $ GND, SCLK( CLK1 ), VCC, VCC );

% |7474:516|2Q %
 _MC023  = DFF( _MC057 $ GND, SCLK( CLK1 ), VCC, VCC );

% |7474:233|2Q %
 _MC024  = DFF( _EQ004 $ GND, SCLK( CLK1 ), VCC, VCC );
  _EQ004 = _MC018 & _MC127;

% |8COUNT:395|QH %
 _MC025  = DFF( _EQ005 $ _EQ006, SCLK( CLK1 ), INIT_, VCC );
  _EQ005 = _MC020 & !_MC026 & !_MC027 & !_MC028 & !_MC029 & !_MC030 &
           !_MC031 & !_MC032 & _MC127
         # DSP_D7 & !_MC020 & _MC127;
  _EQ006 = _MC020 & _MC025;

% |8COUNT:395|QG %
 _MC026  = DFF( _EQ007 $ _EQ008, SCLK( CLK1 ), INIT_, VCC );
  _EQ007 = _MC020 & !_MC027 & !_MC028 & !_MC029 & !_MC030 & !_MC031 &
           !_MC032 & _MC127
         # DSP_D6 & !_MC020 & _MC127;
  _EQ008 = _MC020 & _MC026;
```

```
% |8COUNT:395|QF %
_MC027 = DFF( _EQ009 $ _EQ010, SCLK( CLK1 ), INIT_, VCC );
 _EQ009 = _MC020 & !_MC028 & !_MC029 & !_MC030 & !_MC031 & !_MC032 &
          _MC127
        # DSP_D5 & !_MC020 & _MC127;
 _EQ010 = _MC020 & _MC027;

% |8COUNT:395|QE %
_MC028 = DFF( _EQ011 $ _EQ012, SCLK( CLK1 ), INIT_, VCC );
 _EQ011 = _MC020 & !_MC029 & !_MC030 & !_MC031 & !_MC032 & _MC127
        # DSP_D4 & !_MC020 & _MC127;
 _EQ012 = _MC020 & _MC028;

% |8COUNT:395|QD %
_MC029 = DFF( _EQ013 $ _EQ014, SCLK( CLK1 ), INIT_, VCC );
 _EQ013 = _MC020 & !_MC030 & !_MC031 & !_MC032 & _MC127
        # DSP_D3 & !_MC020 & _MC127;
 _EQ014 = _MC020 & _MC029;

% |8COUNT:395|QC %
_MC030 = DFF( _EQ015 $ _EQ016, SCLK( CLK1 ), INIT_, VCC );
 _EQ015 = _MC020 & !_MC031 & !_MC032 & _MC127
        # DSP_D2 & !_MC020 & _MC127;
 _EQ016 = _MC020 & _MC030;

% |8COUNT:395|QB %
_MC031 = DFF( _EQ017 $ _EQ018, SCLK( CLK1 ), INIT_, VCC );
 _EQ017 = DSP_D1 & !_MC020 & _MC127
        # _MC020 & !_MC032 & _MC127;
 _EQ018 = _MC020 & _MC031;

% |8COUNT:395|QA %
_MC032 = DFF( _EQ019 $ GND, SCLK( CLK1 ), INIT_, VCC );
 _EQ019 = _MC020 & _MC032 & !_MC127
        # DSP_D0 & !_MC020 & _MC127
        # _MC020 & !_MC032 & _MC127;

% |74273:458|:15 %
_MC033 = DFF( RADR14 $ GND, !_MC060, INIT_, VCC );

% |74273:458|:18 %
_MC034 = DFF( RADR11 $ GND, !_MC060, INIT_, VCC );

% |74273:458|:19 %
_MC035 = DFF( RADR10 $ GND, !_MC060, INIT_, VCC );

% |74273:458|:14 %
_MC036 = DFF( RADR15 $ GND, !_MC060, INIT_, VCC );

% |74273:458|:13 %
_MC037 = DFF( RADR16 $ GND, !_MC060, INIT_, VCC );

% |74273:458|:12 %
_MC038 = DFF( RADR17 $ GND, !_MC060, INIT_, VCC );

% |7474:421|1Q %
_MC039 = DFF( _EQ020 $ GND, _MC094, !_MC092, VCC );
 _EQ020 = _MC047 & _MC074 & _MC075 & _MC076 & _MC077 & _MC078 &
          _MC079 & WCRY0
        # _MC056 & ZERO1;

% |8COUNT:122|QH %
_MC040 = DFF( _EQ021 $ _MC040, _MC094, INIT_, VCC );
 _EQ021 = _MC041 & _MC042 & _MC043 & _MC044 & _MC045 & _MC046 &
          _MC056 & _MC065 & ZERO1
        # _MC041 & _MC042 & _MC043 & _MC044 & _MC045 & _MC046 &
```

```
            _MC065 & WCRY1
        # !INIT_ & _MC041 & _MC042 & _MC043 & _MC044 & _MC045 & _MC046 &
            _MC065;

% |8COUNT:122|QG %
_MC041  = DFF( _EQ022 $ _MC041, _MC094, INIT_, VCC );
 _EQ022 = _MC042 & _MC043 & _MC044 & _MC045 & _MC046 & _MC056 &
            _MC065 & ZERO1
        # _MC042 & _MC043 & _MC044 & _MC045 & _MC046 & _MC065 & WCRY1
        # !INIT_ & _MC042 & _MC043 & _MC044 & _MC045 & _MC046 & _MC065;

% |8COUNT:122|QF %
_MC042  = DFF( _EQ023 $ _MC042, _MC094, INIT_, VCC );
 _EQ023 = _MC043 & _MC044 & _MC045 & _MC046 & _MC056 & _MC065 & ZERO1
        # _MC043 & _MC044 & _MC045 & _MC046 & _MC065 & WCRY1
        # !INIT_ & _MC043 & _MC044 & _MC045 & _MC046 & _MC065;

% |8COUNT:122|QE %
_MC043  = DFF( _EQ024 $ _MC043, _MC094, INIT_, VCC );
 _EQ024 = _MC044 & _MC045 & _MC046 & _MC056 & _MC065 & ZERO1
        # _MC044 & _MC045 & _MC046 & _MC065 & WCRY1
        # !INIT_ & _MC044 & _MC045 & _MC046 & _MC065;

% |8COUNT:122|QD %
_MC044  = DFF( _EQ025 $ _MC044, _MC094, INIT_, VCC );
 _EQ025 = _MC045 & _MC046 & _MC056 & _MC065 & ZERO1
        # _MC045 & _MC046 & _MC065 & WCRY1
        # !INIT_ & _MC045 & _MC046 & _MC065;

% |8COUNT:122|QC %
_MC045  = DFF( _EQ026 $ _MC045, _MC094, INIT_, VCC );
 _EQ026 = _MC046 & _MC056 & _MC065 & ZERO1
        # _MC046 & _MC065 & WCRY1
        # !INIT_ & _MC046 & _MC065;

% |8COUNT:122|QA %
_MC046  = DFF( _EQ027 $ !_MC046, _MC094, INIT_, VCC );
 _EQ027 = INIT_ & !WCRY1 & !ZERO1
        # INIT_ & !_MC056 & !WCRY1;

% |8COUNT:119|QA %
_MC047  = DFF( _EQ028 $ GND, _MC094, INIT_, VCC );
 _EQ028 = INIT_ & _MC047 & !WCRY0 & _X002
        # !_MC047 & WCRY0 & _X002
        # !INIT_ & !_MC047 & _X002;
 _X002  = EXP( _MC056 & ZERO1 );

% |COMP:416|NEQ %
_MC048  = MCELL( _EQ029 $ VCC );
 _EQ029 = _X003 & _X004 & _X005 & _X006 & _X007 & _X008 & _X009 &
            _X010 & _X011 & _X012 & _X013 & _X014 & _X015 & _X016 &
            _X017 & _X018 & _X019 & _X020;
 _X003  = EXP( _MC053 & !RADR9 );
 _X004  = EXP( !_MC038 & RADR17 );
 _X005  = EXP( _MC052 & !RADR13 );
 _X006  = EXP( !_MC053 & RADR9 );
 _X007  = EXP( _MC038 & !RADR17 );
 _X008  = EXP( !_MC037 & RADR16 );
 _X009  = EXP( _MC037 & !RADR16 );
 _X010  = EXP( !_MC036 & RADR15 );
 _X011  = EXP( _MC036 & !RADR15 );
 _X012  = EXP( !_MC033 & RADR14 );
 _X013  = EXP( _MC033 & !RADR14 );
 _X014  = EXP( !_MC052 & RADR13 );
 _X015  = EXP( _MC035 & !RADR10 );
 _X016  = EXP( !_MC051 & RADR12 );
```

```
 _X017  = EXP(  _MC051 & !RADR12 );
 _X018  = EXP( !_MC034 &  RADR11 );
 _X019  = EXP(  _MC034 & !RADR11 );
 _X020  = EXP( !_MC035 &  RADR10 );

% |74273:458|:17 %
 _MC051  = DFF(  RADR12 $  GND, !_MC060,  INIT_,  VCC );

% |74273:458|:16 %
 _MC052  = DFF(  RADR13 $  GND, !_MC060,  INIT_,  VCC );

% |74273:457|:12 %
 _MC053  = DFF(  RADR9 $  GND, !_MC060,  INIT_,  VCC );

% |74161:46|QB %
 _MC054  = DFF(  _EQ030 $  VCC,  _MC094,  INIT_,  VCC );
 _EQ030 =  _MC054 &  _MC055
        #  _MC056 &  ZERO1
        # !_MC054 & !_MC055;

% |74161:46|QA %
 _MC055  = DFF(  _EQ031 $ !_MC055,  _MC094,  INIT_,  VCC );
 _EQ031 = !_MC055 &  _MC056 &  ZERO1;

% |7476:598|1Q %
 _MC056  = DFF(  _MC056 $  ZERO1, !_MC094,  INIT_,  VCC );

% |7474:516|1Q %
 _MC057  = DFF(  _EQ032 $  GND,  _EQ033,  _EQ034,  _EQ035 );
 _EQ032 = !_MC048 &  _MC059;
 _EQ033 =  DSP_RW & !DSP_TS &  _X021;
 _X021  = EXP( !DSP_A18 & !TEST );
 _EQ034 =  INIT_ & !_MC023;
 _EQ035 =  _X022;
 _X022  = EXP( !_MC113 & !_MC118 );

% |7474:508|1Q %
 _MC058  = DFF(  VCC $  GND,  _EQ036,  _EQ037,  VCC );
 _EQ036 = !DSP_RW & !DSP_TS &  _X021;
 _EQ037 =  INIT_ &  _X023;
 _X023  = EXP(  _MC020 & !_MC025 & !_MC026 & !_MC027 & !_MC028 & !_MC029 &
             !_MC030 & !_MC031 & !_MC032 &  _MC127 );

% |7474:507|1Q %
 _MC059  = DFF(  VCC $  GND, !_MC060,  INIT_,  VCC );

% |7474:417|1Q %
 _MC060  = DFF(  _EQ038 $  VCC,  _EQ039,  _EQ040,  VCC );
 _EQ038 = !_MC048 &  _MC059;
 _EQ039 =  DSP_RW & !DSP_TS &  _X021;
 _EQ040 =  INIT_ &  _MC118;

% |7474:360|1Q %
 _MC061  = DFF(  VCC $  GND, !HOST_SI,  _EQ041,  VCC );
 _EQ041 =  INIT_ & !_MC094;

% |7474:217|1Q %
 _MC062  = DFF(  _EQ042 $  VCC,  _MC094,  _EQ043,  VCC );
 _EQ042 =  INIT_ & !WCRY1 & !ZERO1
        #  INIT_ & !_MC056 & !WCRY1;
 _EQ043 =  INIT_ & !_MC063;

% :496 %
 _MC063  = MCELL(  _MC083 $  GND );
```

```
% WCRY0 %
 WCRY0   = MCELL(  _EQ044 $  GND );
  _EQ044 =  _MC054 &  _MC055;

% |8COUNT:122|QB %
 _MC065  = DFF(  _EQ045 $  _MC065,  _MC094,  INIT_,  VCC );
  _EQ045 =   _MC046 &  _MC056 &  ZERO1
         #   _MC046 &  WCRY1
         # !INIT_ &  _MC046;

VADR0    = TRI(  _MC066, !ATE);
 _MC066  = MCELL(  _EQ046 $  _EQ047 );
  _EQ046 =   _MC073 &  _MC092 &  _MC118
         #   _MC092 & !_MC118 &  RADR9
         # !_MC092 & !_MC118 &  RADR0;
  _EQ047 =   _MC055 & !_MC092 &  _MC118;

VADR1    = TRI(  _MC067, !ATE);
 _MC067  = MCELL(  _EQ048 $  _EQ049 );
  _EQ048 =   _MC046 &  _MC092 &  _MC118
         #   _MC092 & !_MC118 &  RADR10
         # !_MC092 & !_MC118 &  RADR1;
  _EQ049 =   _MC054 & !_MC092 &  _MC118;

VADR2    = TRI(  _MC068, !ATE);
 _MC068  = MCELL(  _EQ050 $  _EQ051 );
  _EQ050 =   _MC065 &  _MC092 &  _MC118
         #   _MC092 & !_MC118 &  RADR11
         # !_MC092 & !_MC118 &  RADR2;
  _EQ051 =   _MC047 & !_MC092 &  _MC118;

VADR3    = TRI(  _MC069, !ATE);
 _MC069  = MCELL(  _EQ052 $  _EQ053 );
  _EQ052 =   _MC045 &  _MC092 &  _MC118
         #   _MC092 & !_MC118 &  RADR12
         # !_MC092 & !_MC118 &  RADR3;
  _EQ053 =   _MC079 & !_MC092 &  _MC118;

VADR4    = TRI(  _MC070, !ATE);
 _MC070  = MCELL(  _EQ054 $  _EQ055 );
  _EQ054 =   _MC044 &  _MC092 &  _MC118
         #   _MC092 & !_MC118 &  RADR13
         # !_MC092 & !_MC118 &  RADR4;
  _EQ055 =   _MC078 & !_MC092 &  _MC118;

VADR5    = TRI(  _MC071, !ATE);
 _MC071  = MCELL(  _EQ056 $  _EQ057 );
  _EQ056 =   _MC043 &  _MC092 &  _MC118
         #   _MC092 & !_MC118 &  RADR14
         # !_MC092 & !_MC118 &  RADR5;
  _EQ057 =   _MC077 & !_MC092 &  _MC118;

VADR6    = TRI(  _MC072, !ATE);
 _MC072  = MCELL(  _EQ058 $  _EQ059 );
  _EQ058 =   _MC042 &  _MC092 &  _MC118
         #   _MC092 & !_MC118 &  RADR15
         # !_MC092 & !_MC118 &  RADR6;
  _EQ059 =   _MC076 & !_MC092 &  _MC118;

% |8COUNT:119|QH %
 _MC073  = DFF(  _EQ060 $  _EQ061,  _MC094,  INIT_,  VCC );
  _EQ060 =   _MC047 &  _MC074 &  _MC075 &  _MC076 &  _MC077 &  _MC078 &
              _MC079 &  WCRY0 &  _X002
         # !INIT_ &  _MC047 &  _MC074 &  _MC075 &  _MC076 &  _MC077 &  _MC078 &
              _MC079 &  _X002;
  _EQ061 =   _MC073 &  _X002;
```

```
% |8COUNT:119|QG %
 _MC074  = DFF( _EQ062 $ _EQ063, _MC094, INIT_, VCC );
  _EQ062 = _MC047 & _MC075 & _MC076 & _MC077 & _MC078 & _MC079 & WCRY0 &
             _X002
         # !INIT_ & _MC047 & _MC075 & _MC076 & _MC077 & _MC078 & _MC079 &
             _X002;
  _EQ063 = _MC074 & _X002;

% |8COUNT:119|QF %
 _MC075  = DFF( _EQ064 $ _EQ065, _MC094, INIT_, VCC );
  _EQ064 = _MC047 & _MC076 & _MC077 & _MC078 & _MC079 & WCRY0 & _X002
         # !INIT_ & _MC047 & _MC076 & _MC077 & _MC078 & _MC079 & _X002;
  _EQ065 = _MC075 & _X002;

% |8COUNT:119|QE %
 _MC076  = DFF( _EQ066 $ _EQ067, _MC094, INIT_, VCC );
  _EQ066 = _MC047 & _MC077 & _MC078 & _MC079 & WCRY0 & _X002
         # !INIT_ & _MC047 & _MC077 & _MC078 & _MC079 & _X002;
  _EQ067 = _MC076 & _X002;

% |8COUNT:119|QD %
 _MC077  = DFF( _EQ068 $ _EQ069, _MC094, INIT_, VCC );
  _EQ068 = _MC047 & _MC078 & _MC079 & WCRY0 & _X002
         # !INIT_ & _MC047 & _MC078 & _MC079 & _X002;
  _EQ069 = _MC077 & _X002;

% |8COUNT:119|QC %
 _MC078  = DFF( _EQ070 $ _EQ071, _MC094, INIT_, VCC );
  _EQ070 = _MC047 & _MC079 & WCRY0 & _X002
         # !INIT_ & _MC047 & _MC079 & _X002;
  _EQ071 = _MC078 & _X002;

% |8COUNT:119|QB %
 _MC079  = DFF( _EQ072 $ _EQ073, _MC094, INIT_, VCC );
  _EQ072 = _MC047 & WCRY0 & _X002
         # !INIT_ & _MC047 & _X002;
  _EQ073 = _MC079 & _X002;

% WCRY1 %
 WCRY1   = MCELL( _EQ074 $ GND );
  _EQ074 = _MC047 & _MC073 & _MC074 & _MC075 & _MC076 & _MC077 &
            _MC078 & _MC079 & WCRY0;

% |7474:421|2Q %
 _MC081  = DFF( LOAD1 $ GND, SCLK( CLK1 ), VCC, VCC );

% |7474:417|2Q %
 _MC082  = DFF( _EQ075 $ _MC060, SCLK( CLK1 ), VCC, VCC );
  _EQ075 = _MC060 & !_MC085 & !_MC086 & !_MC087 & !_MC088 & !_MC089 &
            !_MC090 & !_MC091 & _MC115 & _MC119;

% |7474:233|1Q %
 _MC083  = DFF( _EQ076 $ GND, SCLK( CLK1 ), VCC, VCC );
  _EQ076 = _MC062 & !_MC083;

% |8COUNT:231|QG %
 _MC085  = DFF( _EQ077 $ _MC085, SCLK( CLK1 ), INIT_, VCC );
  _EQ077 = !_MC024 & _MC083 & _MC086 & _MC087 & _MC088 & _MC089 &
             _MC090 & _MC091
         # _MC024 & !_MC083 & !_MC086 & !_MC087 & !_MC088 & !_MC089 &
            !_MC090 & !_MC091;

% |8COUNT:231|QF %
 _MC086  = DFF( _EQ078 $ _MC086, SCLK( CLK1 ), INIT_, VCC );
  _EQ078 = !_MC024 & _MC083 & _MC087 & _MC088 & _MC089 & _MC090 &
             _MC091
         # _MC024 & !_MC083 & !_MC087 & !_MC088 & !_MC089 & !_MC090 &
```

```
        !_MC091;

% |8COUNT:231|QE %
 _MC087  = DFF( _EQ079 $ _MC087, SCLK( CLK1 ), INIT_, VCC );
 _EQ079 = !_MC024 & _MC083 & _MC088 & _MC089 & _MC090 & _MC091
        # _MC024 & !_MC083 & !_MC088 & !_MC089 & !_MC090 & !_MC091;

% |8COUNT:231|QD %
 _MC088  = DFF( _EQ080 $ _MC088, SCLK( CLK1 ), INIT_, VCC );
 _EQ080 = !_MC024 & _MC083 & _MC089 & _MC090 & _MC091
        # _MC024 & !_MC083 & !_MC089 & !_MC090 & !_MC091;

% |8COUNT:231|QC %
 _MC089  = DFF( _EQ081 $ _MC089, SCLK( CLK1 ), INIT_, VCC );
 _EQ081 = !_MC024 & _MC083 & _MC090 & _MC091
        # _MC024 & !_MC083 & !_MC090 & !_MC091;

% |8COUNT:231|QB %
 _MC090  = DFF( _EQ082 $ _MC090, SCLK( CLK1 ), INIT_, VCC );
 _EQ082 = !_MC024 & _MC083 & _MC091
        # _MC024 & !_MC083 & !_MC091;

% |8COUNT:231|QA %
 _MC091  = DFF( _EQ083 $ _MC091, SCLK( CLK1 ), INIT_, VCC );
 _EQ083 = !_MC024 & _MC083
        # _MC024 & !_MC083;

% |LWSEQ:557|~27~ %
 _MC092  = DFF( _EQ084 $ _EQ085, SCLK( CLK1 ), RST1, VCC );
 _EQ084 =  _MC016 & !_MC085 & !_MC086 & !_MC087 & !_MC088 & !_MC089 &
           !_MC090 & !_MC091 & _MC092 & _MC093 & !_MC094 & _MC113 &
            _MC115 & _MC117 & _MC118 & _MC119 & _MC120 & !_MC128 &
            _X024 & _X025 & _X026 & _X027 & _X028 & _X029 & _X030 &
            _X031 & _X032 & _X033 & _X034 & _X035 & _X036 & _X037 &
            _X038 & _X039 & _X040
        # !_MC039 & !_MC085 & !_MC086 & !_MC087 & !_MC088 & !_MC089 &
           !_MC090 & !_MC091 & !_MC092 & _MC093 & !_MC094 & _MC113 &
            _MC115 & !_MC117 & _MC118 & _MC119 & _MC120 & !_MC128 &
            _X024 & _X025 & _X026 & _X027 & _X028 & _X029 & _X030 &
            _X031 & _X032 & _X033 & _X034 & _X035 & _X036 & _X037 &
            _X038 & _X039 & _X040
        #  _MC016 & !_MC024 & _MC083 & _MC092 & _MC093 & !_MC094 &
            _MC113 & _MC117 & _MC118 & _MC120 & _X024 & _X025 & _X026 &
            _X027 & _X028 & _X029 & _X030 & _X031 & _X032 & _X033 &
            _X034 & _X035 & _X036 & _X037 & _X038 & _X039 & _X040;
  _X024  = EXP( _MC016 & _MC024 & !_MC083 & _MC092 & _MC093 & !_MC094 &
            _MC113 & _MC117 & _MC118 & _MC120 );
  _X025  = EXP( _MC016 & !_MC082 & _MC092 & _MC093 & !_MC094 & _MC113 &
           !_MC115 & _MC117 & _MC118 & _MC120 );
  _X026  = EXP( _MC016 & !_MC082 & _MC092 & _MC093 & !_MC094 & _MC113 &
            _MC117 & _MC118 & _MC120 & !_MC128 );
  _X027  = EXP( !_MC024 & !_MC039 & _MC083 & !_MC092 & _MC093 & !_MC094 &
            _MC113 & !_MC117 & _MC118 & _MC120 );
  _X028  = EXP( _MC024 & !_MC039 & !_MC083 & !_MC092 & _MC093 & !_MC094 &
            _MC113 & !_MC117 & _MC118 & _MC120 );
  _X029  = EXP( !_MC039 & !_MC082 & !_MC092 & _MC093 & !_MC094 & _MC113 &
           !_MC115 & !_MC117 & _MC118 & _MC120 );
  _X030  = EXP( !_MC039 & !_MC082 & !_MC092 & _MC093 & !_MC094 & _MC113 &
           !_MC117 & _MC118 & _MC120 & !_MC128 );
  _X031  = EXP( _MC016 & _MC058 & _MC092 & _MC093 & !_MC094 & _MC113 &

            _MC117 & _MC118 & _MC120 );
  _X032  = EXP( _MC016 & _MC062 & _MC092 & _MC093 & !_MC094 & _MC113 &
            _MC117 & _MC118 & _MC120 );
  _X033  = EXP( !_MC039 & _MC058 & !_MC092 & _MC093 & !_MC094 & _MC113 &
           !_MC117 & _MC118 & _MC120 );
  _X034  = EXP( !_MC039 & _MC062 & !_MC092 & _MC093 & !_MC094 & _MC113 &
```

```
            !_MC117 &  _MC118 &  _MC120 );
 _X035  = EXP(  _MC016 & !_MC092 &  _MC093 & !_MC094 & !_MC113 & !_MC117 &
            !_MC118 &  _MC120 );
 _X036  = EXP( !_MC092 &  _MC093 &  _MC094 & !_MC113 & !_MC117 &  _MC118 &
            !_MC120 );
 _X037  = EXP( !_MC092 &  _MC093 & !_MC094 &  _MC113 & !_MC117 & !_MC118 &
             _MC120 );
 _X038  = EXP(  _MC092 &  _MC093 & !_MC094 &  _MC113 & !_MC117 &  _MC120 );
 _X039  = EXP( !_MC092 &  _MC093 & !_MC094 &  _MC117 &  _MC118 &  _MC120 );
 _X040  = EXP( !_MC092 &  _MC093 & !_MC094 & !_MC117 &  _MC118 & !_MC120 );
 _EQ085 =  _X024 &  _X025 &  _X026 &  _X027 &  _X028 &  _X029 &  _X030 &
             _X031 &  _X032 &  _X033 &  _X034 &  _X035 &  _X036 &  _X037 &
             _X038 &  _X039 &  _X040;

% |LWSEQ:557|~23~ %
 _MC093 = DFF(  _EQ086 $ VCC, SCLK( CLK1 ), RST1, VCC );
 _EQ086 = !_MC092 & !_MC093 & !_MC094 & !_MC113 & !_MC117 & !_MC118 &
            !_MC120
       #  _MC092 & !_MC093 & !_MC094 &  _MC113 &  _MC117 &  _MC120;

% |LWSEQ:557|~22~ %
 _MC094 = DFF(  _EQ087 $ GND, SCLK( CLK1 ), RST1, VCC );
 _EQ087 = !_MC081 &  _MC092 & !_MC093 & !_MC094 &  _MC113 &  _MC117 &
             _MC118 &  _MC120
       # !_MC092 &  _MC093 & !_MC094 &  _MC113 & !_MC117 &  _MC118 &
            !_MC120;

% |LWSEQ:557|REFOFF %
 _MC095 = MCELL(  _EQ088 $ VCC );
 _EQ088 = !_MC093 &  _MC094
       # !_MC113 &  _MC117;

% INIT_ %
 INIT_  = MCELL(  _MC093 $ GND );

REF_ON_ = TRI(  _MC097, !ATE);
 _MC097 = MCELL(  _EQ089 $ VCC );
 _EQ089 = !_MC104 & !_MC105 & !_MC106 & !_MC107 & !_MC108 & !_MC109 &
            !_MC110 & !_MC111 & !_MC112;

V_SE    = TRI(  _MC098, !ATE);
 _MC098 = MCELL(  _EQ090 $ VCC );
 _EQ090 =  DSP_RW & !DSP_TS &  TEST
       #  DSP_A18 &  DSP_RW & !DSP_TS;

VADR7   = TRI(  _MC100, !ATE);
 _MC100 = MCELL(  _EQ091 $  _EQ092 );
 _EQ091 =  _MC041 &  _MC092 &  _MC118
       #  _MC092 & !_MC118 &  RADR16
       # !_MC092 & !_MC118 &  RADR7;
 _EQ092 =  _MC075 & !_MC092 &  _MC118;

VADR8   = TRI(  _MC101, !ATE);
 _MC101 = MCELL(  _EQ093 $  _EQ094 );
 _EQ093 =  _MC040 &  _MC092 &  _MC118
       #  _MC092 & !_MC118 &  RADR17
       # !_MC092 & !_MC118 &  RADR8;
 _EQ094 =  _MC074 & !_MC092 &  _MC118;

% |7474:581|2Q %
 _MC104 = DFF(  _EQ095 $ GND, SCLK( CLK1 ), VCC, VCC );
 _EQ095 = !_MC104 & !_MC105 & !_MC106 & !_MC107 & !_MC108 & !_MC109 &
            !_MC110 & !_MC111 & !_MC112;

% |8COUNT:578|QH %
 _MC105 = DFF(  _EQ096 $  _MC105, SCLK( CLK1 ), VCC, VCC );
 _EQ096 = !_MC104 &  _MC105 & !_MC106 & !_MC107 & !_MC108 & !_MC109 &
```

```
        !_MC110 & !_MC111 & !_MC112
      # !_MC105 & !_MC106 & !_MC107 & !_MC108 & !_MC109 & !_MC110 &
        !_MC111 & !_MC112
      #  _MC104 & !_MC105;

% |8COUNT:578|QG  %
 _MC106  = DFF(  _EQ097 $  _MC106, SCLK( CLK1 ),  VCC,  VCC );
  _EQ097 = !_MC104 &  _MC106 & !_MC107 & !_MC108 & !_MC109 & !_MC110 &
        !_MC111 & !_MC112
      # !_MC106 & !_MC107 & !_MC108 & !_MC109 & !_MC110 & !_MC111 &
        !_MC112
      #  _MC104 & !_MC106;

% |8COUNT:578|QF  %
 _MC107  = DFF(  _EQ098 $  _MC107, SCLK( CLK1 ),  VCC,  VCC );
  _EQ098 = !_MC104 & !_MC107 & !_MC108 & !_MC109 & !_MC110 & !_MC111 &
        !_MC112
      #  _MC107 & !_MC108 & !_MC109 & !_MC110 & !_MC111 & !_MC112
      #  _MC104 &  _MC107;

% |8COUNT:578|QE  %
 _MC108  = DFF(  _EQ099 $  _MC108, SCLK( CLK1 ),  VCC,  VCC );
  _EQ099 = !_MC104 & !_MC108 & !_MC109 & !_MC110 & !_MC111 & !_MC112
      #  _MC108 & !_MC109 & !_MC110 & !_MC111 & !_MC112
      #  _MC104 &  _MC108;

% |8COUNT:578|QD  %
 _MC109  = DFF(  _EQ100 $  _MC109, SCLK( CLK1 ),  VCC,  VCC );
  _EQ100 = !_MC104 & !_MC109 & !_MC110 & !_MC111 & !_MC112
      #  _MC109 & !_MC110 & !_MC111 & !_MC112
      #  _MC104 &  _MC109;

% |8COUNT:578|QC  %
 _MC110  = DFF(  _EQ101 $  GND, SCLK( CLK1 ),  VCC,  VCC );
  _EQ101 = !_MC104 & !_MC110 & !_MC111 & !_MC112
      # !_MC104 &  _MC110 &  _MC111
      # !_MC104 &  _MC110 &  _MC112;

% |8COUNT:578|QB  %
 _MC111  = DFF(  _EQ102 $  GND, SCLK( CLK1 ),  VCC,  VCC );
  _EQ102 = !_MC104 &  _MC111 &  _MC112
      # !_MC104 & !_MC111 & !_MC112;

% |8COUNT:578|QA  %
 _MC112  = DFF(  _EQ103 $ !_MC104, SCLK( CLK1 ),  VCC,  VCC );
  _EQ103 = !_MC104 &  _MC112;
CAS_     = TRI(  _MC113, !ATE);
 _MC113  = DFF(  _EQ104 $  _EQ105, SCLK( CLK1 ),  RST1,  VCC );
  _EQ104 = !_MC092 &  _MC093 & !_MC094 &  _MC113 & !_MC117 &  _MC118 &
        !_MC120
      # !_MC092 &  _MC093 & !_MC094 &  _MC113 & !_MC117 & !_MC118 &
         _MC120
      # !_MC092 &  _MC093 & !_MC094 &  _MC118 &  _MC120 &  _X041;
  _X041  = EXP(  _MC113 & !_MC117 );
  _EQ105 =  _X036;

LW_ORDY  = TRI(  _MC114, !ATE);
 _MC114  = MCELL(  _EQ106 $  VCC );
  _EQ106 = !_MC085 & !_MC086 & !_MC087 & !_MC088 & !_MC089 & !_MC090 &
        !_MC091 &  _MC115 &  _MC119;

LW_IRDY  = TRI(  _MC115, !ATE);
 _MC115  = DFF(  _EQ107 $  _MC115, SCLK( CLK1 ),  VCC,  INIT_ );
  _EQ107 = !_MC024 &  _MC083 &  _MC085 &  _MC086 &  _MC087 &  _MC088 &
         _MC089 &  _MC090 &  _MC091 & !_MC119
      #  _MC024 & !_MC083 & !_MC085 & !_MC086 & !_MC087 & !_MC088 &
        !_MC089 & !_MC090 & !_MC091 &  _MC119;
```

```
RAS_     = TRI(  _MC117, !ATE);
 _MC117  = DFF(  _EQ108 $  _EQ109, SCLK( CLK1 ),  RST1,  VCC );
 _EQ108 = !_MC016 & !_MC039 & !_MC085 & !_MC086 & !_MC087 & !_MC088 &
           !_MC089 & !_MC090 & !_MC091 & !_MC092 &  _MC093 & !_MC094 &
            _MC115 & !_MC117 &  _MC118 &  _MC119 &  _X040 &  _X042 &  _X043 &
            _X044 &  _X045 &  _X046 &  _X047 &  _X048 &  _X049 &  _X050 &
            _X051 &  _X052 &  _X053 &  _X054
       #  _MC024 & !_MC039 & !_MC058 & !_MC062 &  _MC083 & !_MC092 &
            _MC093 & !_MC094 &  _MC115 & !_MC117 &  _MC118 &  _MC128 &
            _X040 &  _X042 &  _X043 &  _X044 &  _X045 &  _X046 &  _X047 &
            _X048 &  _X049 &  _X050 &  _X051 &  _X052 &  _X053 &  _X054
       # !_MC024 & !_MC039 & !_MC058 & !_MC062 & !_MC083 & !_MC092 &
            _MC093 & !_MC094 &  _MC115 & !_MC117 &  _MC118 &  _MC128 &
            _X040 &  _X042 &  _X043 &  _X044 &  _X045 &  _X046 &  _X047 &
            _X048 &  _X049 &  _X050 &  _X051 &  _X052 &  _X053 &  _X054;
  _X042  = EXP(  _MC092 &  _MC093 & !_MC094 & !_MC117 &  _MC118 &  _MC120 );
  _X043  = EXP(  _MC024 & !_MC058 & !_MC062 &  _MC083 &  _MC092 &  _MC093 &
           !_MC094 &  _MC113 &  _MC115 &  _MC120 &  _MC128 );
  _X044  = EXP( !_MC024 & !_MC058 & !_MC062 & !_MC083 &  _MC092 &  _MC093 &
           !_MC094 &  _MC113 &  _MC115 &  _MC120 &  _MC128 );
  _X045  = EXP( !_MC016 &  _MC024 & !_MC039 & !_MC083 & !_MC092 &  _MC093 &
           !_MC094 & !_MC117 &  _MC118 );
  _X046  = EXP( !_MC016 & !_MC024 & !_MC039 &  _MC083 & !_MC092 &  _MC093 &
           !_MC094 & !_MC117 &  _MC118 );
  _X047  = EXP( !_MC016 & !_MC039 & !_MC092 &  _MC093 & !_MC094 &  _MC115 &
           !_MC117 &  _MC118 &  _MC128 );
  _X048  = EXP( !_MC016 & !_MC039 &  _MC062 & !_MC092 &  _MC093 & !_MC094 &
           !_MC117 &  _MC118 );
  _X049  = EXP( !_MC016 & !_MC039 &  _MC058 & !_MC092 &  _MC093 & !_MC094 &
           !_MC117 &  _MC118 );
  _X050  = EXP( !_MC016 & !_MC039 & !_MC082 & !_MC092 &  _MC093 & !_MC094 &
           !_MC117 &  _MC118 );
  _X051  = EXP(  _MC092 &  _MC093 & !_MC094 &  _MC113 & !_MC118 &  _MC120 );
  _X052  = EXP(  _MC093 & !_MC094 &  _MC113 & !_MC117 & !_MC118 &  _MC120 );
  _X053  = EXP( !_MC092 &  _MC093 & !_MC094 & !_MC113 &  _MC118 &  _MC120 );
  _X054  = EXP( !_MC092 &  _MC093 & !_MC113 & !_MC117 &  _MC118 & !_MC120 );
  _EQ109 =  _X040 &  _X042 &  _X043 &  _X044 &  _X045 &  _X046 &  _X047 &
            _X048 &  _X049 &  _X050 &  _X051 &  _X052 &  _X053 &  _X054;

TRG      = TRI(  _MC118, !ATE);
 _MC118  = DFF(  _EQ110 $  _MC093, SCLK( CLK1 ),  RST1,  VCC );
 _EQ110 =  _X055 &  _X056 &  _X057 &  _X058 &  _X059 &  _X060 &  _X061 &
            _X062 &  _X063 &  _X064 &  _X065 &  _X066 &  _X067 &  _X068 &
            _X069;
  _X055  = EXP( !_MC085 & !_MC086 & !_MC087 & !_MC088 & !_MC089 & !_MC090 &
           !_MC091 &  _MC093 &  _MC115 &  _MC118 &  _MC119 );
  _X056  = EXP(  _MC093 & !_MC113 );
  _X057  = EXP(  _MC092 &  _MC093 & !_MC117 &  _MC118 );
  _X058  = EXP( !_MC081 &  _MC092 & !_MC093 & !_MC094 &  _MC113 &  _MC117 &
           !_MC118 &  _MC120 );
  _X059  = EXP(  _MC093 &  _MC094 );
  _X060  = EXP( !_MC082 &  _MC093 &  _MC118 );
  _X061  = EXP( !_MC092 &  _MC093 &  _MC117 );
  _X062  = EXP(  _MC093 &  _MC113 & !_MC120 );
  _X063  = EXP(  _MC058 &  _MC093 &  _MC118 );
  _X064  = EXP(  _MC062 &  _MC093 &  _MC118 );
  _X065  = EXP( !_MC092 & !_MC093 & !_MC094 & !_MC113 & !_MC117 & !_MC118 &
           !_MC120 );
  _X066  = EXP(  _MC024 & !_MC083 &  _MC093 &  _MC118 );
  _X067  = EXP( !_MC024 &  _MC083 &  _MC093 &  _MC118 );
  _X068  = EXP(  _MC093 &  _MC115 &  _MC118 &  _MC128 );
  _X069  = EXP(  _MC039 & !_MC092 &  _MC093 &  _MC118 );

LW_HPTY  = TRI(  _MC119, !ATE);
 _MC119  = DFF(  _EQ111 $  _MC119, SCLK( CLK1 ),  VCC,  INIT_ );
  _EQ111 = !_MC024 &  _MC083 &  _MC085 &  _MC086 &  _MC087 &  _MC088 &
```

```
          _MC089 &  _MC090 &  _MC091
        # _MC024 & !_MC083 & !_MC085 & !_MC086 & !_MC087 & !_MC088 &
          !_MC089 & !_MC090 & !_MC091;

WEN     = TRI(  _MC120, !ATE);
 _MC120 = DFF(  _EQ112 $  VCC, SCLK( CLK1 ),  RST1,  VCC );
 _EQ112 = !_MC092 &  _MC093 & !_MC094 &  _MC113 & !_MC117 &  _MC118 &
          !_MC120
        # !_MC092 &  _MC093 &  _MC094 & !_MC113 & !_MC117 &  _MC118 &
          !_MC120
        #  _MC092 &  _MC093 & !_MC094 & !_MC117 &  _MC118 &  _MC120;

% |7474:508|2Q  %
 _MC127 = DFF(  _MC058 $  GND, SCLK( CLK1 ),  VCC,  VCC );

% |7474:360|2Q  %
 _MC128 = DFF(  _MC061 $  GND, SCLK( CLK1 ),  _EQ113,  VCC );
 _EQ113 =  INIT_ & !_MC094;


%
    Expanders that are Duplicated in Multiple LABs:
    _X002 occurs in LABs --C-E---
    _X036 occurs in LABs -----F-H
    _X040 occurs in LABs -----F-H
%
```

APPENDIX - G

```
MAX+PLUS Compiler Report File
 Version 2.50  05/31/90

***** Design compiled without errors

Title: CT_BUFFER 2
Company: Scitex
Designer: ELI KATZIR
Rev: A
Date:  3:27p 11-08-1990
Turbo: ON
Security: OFF
                                          T     B
                  V                       S     U     L
                                          T     F     D  M  M  M  M
               W  O  T  R  C                 C        _  B  B  B  B  M
            A  E  R  R  A  A  V  S  L  S  G  N  _  _  _  _  B
            T  N  D  G  S  S  C  T  K  E  N  O  1  1  1  1  _
            E  _  Y  _  _  _  C  R  1  L  D  P  3  2  1  0  9
          -----------------------------------------------------
         /  9  8  7  6  5  4  3  2  1 68 67 66 65 64 63 62 61  |
RESERVED | 10                                               60 | MB_8
RESERVED | 11                                               59 | MB_7
   VADR2 | 12                                               58 | MB_6
   VADR3 | 13                                               57 | V_SCLK
RESERVED | 14                                               56 | V_IRDY
RESERVED | 15                                               55 | RESERVED
     GND | 16                                               54 | VCC
RESERVED | 17                                               53 | SEN
   VADR0 | 18                   EPM5128-2                   52 | RESERVED
   VADR1 | 19                                               51 | UNPACK
     VCC | 20                                               50 | GND
   VADR4 | 21                                               49 | REF_ON
RESERVED | 22                                               48 | ODDADD
RESERVED | 23                                               47 | MB_15
  BUF_SO | 24                                               46 | MB_14
   LOAD1 | 25                                               45 | VADR8
LOWER_SI | 26                                               44 | VADR6
         |_ 27 28 29 30 31 32 33 34 35 36 37 38 39 40 41 42 43 _|
          -----------------------------------------------------
```

| UPPER_SI | VADDR5 | VADDR7 | RESERVED | RESERVED | TEST | GND | CT_STR | RST1 | LINE | VCC | MB_0 | MB_1 | MB_2 | MB_3 | MB_4 | MB_5 |
|---|---|---|---|---|---|---|---|---|---|---|---|---|---|---|---|---|

| Logic Array Block | | Macrocells | I/O Pins | Expanders | External Interconnect |
|---|---|---|---|---|---|
| A: | MC1 - MC16 | 16/16(100%) | 6/ 8( 75%) | 30/32( 93%) | 15/24( 62%) |
| B: | MC17 - MC32 | 13/16( 81%) | 2/ 5( 40%) | 1/32( 3%) | 20/24( 83%) |
| C: | MC33 - MC48 | 16/16(100%) | 3/ 5( 60%) | 0/32( 0%) | 22/24( 91%) |
| D: | MC49 - MC64 | 5/16( 31%) | 6/ 8( 75%) | 12/32( 37%) | 16/24( 66%) |
| E: | MC65 - MC80 | 16/16(100%) | 8/ 8(100%) | 14/32( 43%) | 23/24( 95%) |
| F: | MC81 - MC96 | 16/16(100%) | 5/ 5(100%) | 23/32( 71%) | 24/24(100%) |
| G: | MC97 - MC112 | 12/16( 75%) | 3/ 5( 60%) | 25/32( 78%) | 22/24( 91%) |
| H: | MC113 - MC128 | 16/16(100%) | 8/ 8(100%) | 13/32( 40%) | 23/24( 95%) |

```
Total dedicated input pins used:      8/  8 (100%)
Total I/O pins used:                 41/ 52 ( 78%)
Total macrocells used:              110/128 ( 85%)
Total expanders used:               118/256 ( 46%)

Total input pins required:           30
Total output pins required:          19
Total bidirectional pins required:    0
Total macrocells required:          110
Total expanders in database:        108

Synthesized macrocells:               0/128 (  0%)
```

|8COUNT: 231|
|74273: 90|
|74273: 89|
|74253: 469|
|74253: 470|
|74253: 471|
|74253: 472|
|74253: 473|
|74244: 474|
|74240: 475|
|74161: 22|
|74161: 127|
|74161: 40|
|74161: 450|
|PACK: 405|
|CTSEQ2: 381|
|7476: 478|
|7476: 329|
|7474: 245|
|7474: 375|
|7474: 395|
|7474: 406|
|7474: 407|
|7474: 486|
|7474: 233|
|7474: 217|
|74157: 438|
|74157: 437|
|74157: 487|
|74157: 439|
|8COUNT: 131|
|8COUNT: 132|
|8COUNT: 119|
|8COUNT: 122|

| Pin | MCell | LAB | Primitive | Expanders Total | Expanders Shared | Fan-In INP | Fan-In FBK | Name |
|---|---|---|---|---|---|---|---|---|
| 9 | (6) | (A) | INPUT | 0 | 0 | 0 | 0 | ATE |
| 68 | - | - | INPUT | 0 | 0 | 0 | 0 | BUF_SEL |
| 24 | (49) | (D) | INPUT | 0 | 0 | 0 | 0 | BUF_SO |
| 1 | - | - | INPUT | 0 | 0 | 0 | 0 | CLK1 |
| 34 | - | - | INPUT | 0 | 0 | 0 | 0 | CT_STR |
| 66 | - | - | INPUT | 0 | 0 | 0 | 0 | LD_NOP |
| 36 | - | - | INPUT | 0 | 0 | 0 | 0 | LINE |
| 25 | (50) | (D) | INPUT | 0 | 0 | 0 | 0 | LOAD1 |
| 38 | (65) | (E) | INPUT | 0 | 0 | 0 | 0 | MB_0 |
| 39 | (66) | (E) | INPUT | 0 | 0 | 0 | 0 | MB_1 |
| 40 | (67) | (E) | INPUT | 0 | 0 | 0 | 0 | MB_2 |
| 41 | (68) | (E) | INPUT | 0 | 0 | 0 | 0 | MB_3 |
| 42 | (69) | (E) | INPUT | 0 | 0 | 0 | 0 | MB_4 |
| 43 | (70) | (E) | INPUT | 0 | 0 | 0 | 0 | MB_5 |
| 58 | (113) | (H) | INPUT | 0 | 0 | 0 | 0 | MB_6 |
| 59 | (114) | (H) | INPUT | 0 | 0 | 0 | 0 | MB_7 |
| 60 | (115) | (H) | INPUT | 0 | 0 | 0 | 0 | MB_8 |
| 61 | (116) | (H) | INPUT | 0 | 0 | 0 | 0 | MB_9 |
| 62 | (117) | (H) | INPUT | 0 | 0 | 0 | 0 | MB_10 |
| 63 | (118) | (H) | INPUT | 0 | 0 | 0 | 0 | MB_11 |
| 64 | (119) | (H) | INPUT | 0 | 0 | 0 | 0 | MB_12 |
| 65 | (120) | (H) | INPUT | 0 | 0 | 0 | 0 | MB_13 |
| 46 | (81) | (F) | INPUT | 0 | 0 | 0 | 0 | MB_14 |
| 47 | (82) | (F) | INPUT | 0 | 0 | 0 | 0 | MB_15 |
| 48 | (83) | (F) | INPUT | 0 | 0 | 0 | 0 | ODDADD |
| 49 | (84) | (F) | INPUT | 0 | 0 | 0 | 0 | REF_ON |
| 35 | - | - | INPUT | 0 | 0 | 0 | 0 | RST1 |
| 32 | - | - | INPUT | 0 | 0 | 0 | 0 | TEST |
| 2 | - | - | INPUT | 0 | 0 | 0 | 0 | TST_STR |
| 51 | (85) | (F) | INPUT | 0 | 0 | 0 | 0 | UNPACK |

| Pin | MCell | LAB | Primitive | Expanders Total | Expanders Shared | Fan-In INP | Fan-In FBK | Name |
|---|---|---|---|---|---|---|---|---|
| 4 | 1 | A | DFF+ | 2 | 1 | 3 | 12 | CAS_ |
| 26 | 51 | D | AND2 | 0 | 0 | 1 | 2 | LOWER_SI |
| 5 | 2 | A | DFF+ | 19 | 6 | 4 | 23 | RAS_ |
| 53 | 98 | G | DFF+ | 0 | 0 | 2 | 2 | SEN_ |
| 6 | 3 | A | DFF+ | 6 | 5 | 4 | 19 | TRG_ |
| 27 | 52 | D | AND2 | 0 | 0 | 1 | 2 | UPPER_SI |
| 18 | 33 | C | OR4 | 0 | 0 | 1 | 6 | VADR0 |
| 19 | 34 | C | OR4 | 0 | 0 | 1 | 6 | VADR1 |
| 12 | 17 | B | OR4 | 0 | 0 | 1 | 6 | VADR2 |
| 13 | 18 | B | OR4 | 0 | 0 | 1 | 6 | VADR3 |
| 21 | 35 | C | OR4 | 0 | 0 | 1 | 6 | VADR4 |
| 28 | 53 | D | OR4 | 6 | 0 | 2 | 8 | VADR5 |
| 44 | 71 | E | OR4 | 6 | 0 | 2 | 8 | VADR6 |
| 29 | 54 | D | OR4 | 6 | 0 | 2 | 8 | VADR7 |
| 45 | 72 | E | OR4 | 6 | 0 | 2 | 8 | VADR8 |
| 56 | 100 | G | NOT | 0 | 0 | 4 | 8 | V_IRDY_ |
| 7 | 4 | A | NOT | 0 | 0 | 1 | 5 | V_ORDY_ |
| 57 | 101 | G | OR3 | 0 | 0 | 4 | 3 | V_SCLK |
| 8 | 5 | A | DFF+ | 3 | 3 | 4 | 16 | WEN_ |

| Pin | MCell | LAB | Primitive | Expanders Total | Expanders Shared | Fan-In INP | Fan-In FBK | Name | |
|---|---|---|---|---|---|---|---|---|---|
| - | 16 | A | SOFT | 0 | 0 | 0 | 4 | CTSEQ2: 381 | REFOFF |
| - | 112 | G | DFF+ | 13 | 0 | 3 | 23 | CTSEQ2: 381 | ~31~ |
| - | 15 | A | DFF+ | 0 | 0 | 2 | 9 | CTSEQ2: 381 | ~32~ |
| - | 14 | A | DFF+ | 0 | 0 | 2 | 13 | CTSEQ2: 381 | ~33~ |
| - | 13 | A | DFF+ | 0 | 0 | 2 | 9 | CTSEQ2: 381 | ~34~ |
| - | 111 | G | DFF+ | 12 | 4 | 3 | 24 | CTSEQ2: 381 | ~39~ |
| - | 12 | A | DFF+ | 11 | 4 | 3 | 17 | CTSEQ2: 381 | ~40~ |
| - | 11 | A | MCELL | 0 | 0 | 0 | 1 | INIT_ | |
| - | 96 | F | DFF | 2 | 1 | 4 | 6 | PACK: 405 | ~6~ |
| - | 95 | F | DFF | 4 | 1 | 4 | 6 | PACK: 405 | ~7~ |

| | | | | | | | | | |
|---|---|---|---|---|---|---|---|---|---|
| - | 80 | E | MCELL | 0 | 0 | 1 | 3 | RCRY0 | |
| - | 32 | B | MCELL | 0 | 0 | 1 | 9 | RCRY1 | |
| - | 48 | C | MCELL | 0 | 0 | 0 | 8 | RCRY2 | |
| - | 94 | F | DFF | 1 | 1 | 1 | 5 | 8COUNT: 119 | QA |
| - | 93 | F | DFF | 1 | 1 | 1 | 6 | 8COUNT: 119 | QB |
| - | 31 | B | DFF | 1 | 1 | 1 | 7 | 8COUNT: 119 | QC |
| - | 30 | B | DFF | 1 | 1 | 1 | 8 | 8COUNT: 119 | QD |
| - | 29 | B | DFF | 1 | 1 | 1 | 9 | 8COUNT: 119 | QE |
| - | 28 | B | DFF | 1 | 1 | 1 | 10 | 8COUNT: 119 | QF |
| - | 27 | B | DFF | 1 | 1 | 1 | 11 | 8COUNT: 119 | QG |
| - | 79 | E | DFF | 0 | 0 | 0 | 5 | 8COUNT: 122 | QA |
| - | 47 | C | DFF | 0 | 0 | 0 | 6 | 8COUNT: 122 | QB |
| - | 46 | C | DFF | 0 | 0 | 0 | 7 | 8COUNT: 122 | QC |
| - | 45 | C | DFF | 0 | 0 | 0 | 8 | 8COUNT: 122 | QD |
| - | 44 | C | DFF | 0 | 0 | 0 | 9 | 8COUNT: 122 | QE |
| - | 43 | C | DFF | 0 | 0 | 0 | 10 | 8COUNT: 122 | QF |
| - | 42 | C | DFF | 0 | 0 | 0 | 11 | 8COUNT: 122 | QG |
| - | 128 | H | DFF | 5 | 4 | 3 | 19 | 8COUNT: 131 | QA |
| - | 127 | H | DFF | 5 | 4 | 3 | 19 | 8COUNT: 131 | QB |
| - | 126 | H | DFF | 5 | 4 | 3 | 19 | 8COUNT: 131 | QC |
| - | 125 | H | DFF | 5 | 4 | 3 | 19 | 8COUNT: 131 | QD |
| - | 124 | H | DFF | 5 | 4 | 3 | 19 | 8COUNT: 131 | QE |
| - | 123 | H | DFF | 5 | 4 | 3 | 19 | 8COUNT: 131 | QF |
| - | 122 | H | DFF | 5 | 4 | 3 | 19 | 8COUNT: 131 | QG |
| - | 92 | F | DFF | 6 | 4 | 3 | 15 | 8COUNT: 132 | QA |
| - | 91 | F | DFF | 6 | 4 | 3 | 16 | 8COUNT: 132 | QB |
| - | 90 | F | DFF | 6 | 4 | 3 | 17 | 8COUNT: 132 | QC |
| - | 89 | F | DFF | 6 | 4 | 3 | 18 | 8COUNT: 132 | QD |
| - | 88 | F | DFF | 6 | 4 | 3 | 19 | 8COUNT: 132 | QE |
| - | 87 | F | DFF | 6 | 4 | 3 | 20 | 8COUNT: 132 | QF |
| - | 121 | H | DFF | 6 | 4 | 3 | 21 | 8COUNT: 132 | QG |
| - | 110 | G | DFF+ | 0 | 0 | 1 | 3 | 8COUNT: 231 | QA |
| - | 109 | G | DFF+ | 0 | 0 | 1 | 4 | 8COUNT: 231 | QB |
| - | 108 | G | DFF+ | 0 | 0 | 1 | 5 | 8COUNT: 231 | QC |
| - | 107 | G | DFF+ | 0 | 0 | 1 | 6 | 8COUNT: 231 | QD |
| - | 10 | A | DFF+ | 0 | 0 | 1 | 7 | 8COUNT: 231 | QE |
| - | 78 | E | DFF | 0 | 0 | 1 | 5 | 7474: 217 | 1Q |
| (65) | 120 | H | DFF | 0 | 0 | 0 | 11 | 7474: 217 | 2Q |
| - | 9 | A | DFF+ | 0 | 0 | 1 | 1 | 7474: 233 | 1Q |
| (9) | 6 | A | DFF+ | 0 | 0 | 1 | 1 | 7474: 233 | 2Q |
| (64) | 119 | H | DFF | 4 | 4 | 3 | 13 | 7474: 245 | 1Q |
| - | 106 | G | DFF+ | 0 | 0 | 4 | 3 | 7474: 245 | 2Q |
| - | 105 | G | DFF+ | 0 | 0 | 1 | 1 | 7474: 375 | 1Q |
| - | 77 | E | DFF | 0 | 0 | 1 | 2 | 7474: 395 | 1Q |
| (10) | 7 | A | DFF+ | 0 | 0 | 1 | 1 | 7474: 395 | 2Q |
| - | 76 | E | DFF | 0 | 0 | 1 | 1 | 7474: 406 | 1Q |
| - | 75 | E | DFF | 0 | 0 | 0 | 3 | 7474: 406 | 2Q |
| (63) | 118 | H | DFF | 4 | 4 | 3 | 12 | 7474: 407 | 1Q |
| - | 104 | G | DFF+ | 0 | 0 | 1 | 1 | 7474: 407 | 2Q |
| (11) | 8 | A | DFF+ | 0 | 0 | 2 | 0 | 7474: 486 | 1Q |
| (62) | 117 | H | DFF | 4 | 4 | 3 | 11 | 7476: 329 | 2Q |
| - | 64 | D | DFF | 0 | 0 | 0 | 3 | 7476: 478 | 1Q |
| - | 74 | E | DFF | 0 | 0 | 0 | 3 | 7476: 478 | 2Q |
| - | 86 | F | DFF | 4 | 4 | 3 | 4 | 74161: 22 | QA |
| (51) | 85 | F | DFF | 4 | 4 | 3 | 4 | 74161: 22 | QB |
| - | 73 | E | DFF | 0 | 0 | 1 | 4 | 74161: 40 | QA |
| (43) | 70 | E | DFF | 0 | 0 | 1 | 5 | 74161: 40 | QB |
| (42) | 69 | E | DFF | 0 | 0 | 1 | 6 | 74161: 40 | QC |
| (41) | 68 | E | DFF | 0 | 0 | 1 | 7 | 74161: 40 | QD |
| (61) | 116 | H | DFF | 4 | 4 | 3 | 19 | 74161: 127 | QA |
| (60) | 115 | H | DFF | 4 | 4 | 3 | 20 | 74161: 127 | QB |
| (59) | 114 | H | DFF | 4 | 4 | 3 | 21 | 74161: 127 | QC |
| (58) | 113 | H | DFF | 4 | 4 | 3 | 22 | 74161: 127 | QD |
| (49) | 84 | F | DFF | 1 | 1 | 1 | 5 | 74161: 450 | QA |
| (40) | 67 | E | DFF | 2 | 1 | 1 | 6 | 74161: 450 | QB |
| - | 26 | B | DFF | 0 | 0 | 2 | 0 | 74273: 89 | : 12 |

| | | | | | | | | | |
|---|---|---|---|---|---|---|---|---|---|
| - | 25 | B | DFF | 0 | 0 | 2 | 0 | 74273:89 | :13 |
| - | 24 | B | DFF | 0 | 0 | 2 | 0 | 74273:89 | :14 |
| - | 23 | B | DFF | 0 | 0 | 2 | 0 | 74273:89 | :15 |
| (48) | 83 | F | DFF | 0 | 0 | 2 | 0 | 74273:89 | :16 |
| (47) | 82 | F | DFF | 0 | 0 | 2 | 0 | 74273:89 | :17 |
| (39) | 66 | E | DFF | 0 | 0 | 2 | 0 | 74273:89 | :18 |
| (46) | 81 | F | DFF | 0 | 0 | 2 | 0 | 74273:89 | :19 |
| - | 41 | C | DFF | 0 | 0 | 2 | 0 | 74273:90 | :12 |
| - | 40 | C | DFF | 0 | 0 | 2 | 0 | 74273:90 | :13 |
| - | 39 | C | DFF | 0 | 0 | 2 | 0 | 74273:90 | :14 |
| - | 38 | C | DFF | 0 | 0 | 2 | 0 | 74273:90 | :15 |
| (22) | 36 | C | DFF | 0 | 0 | 2 | 0 | 74273:90 | :16 |
| (23) | 37 | C | DFF | 0 | 0 | 2 | 0 | 74273:90 | :17 |
| (38) | 65 | E | DFF | 0 | 0 | 2 | 0 | 74273:90 | :18 |
| - | 22 | B | DFF | 0 | 0 | 2 | 0 | 74273:90 | :19 |

Logic Array Block "A":

```
          M M M M M M M M M M M M M M M M
          C C C C C C C C C C C C C C C C
          1 1 1 1 1 1 1 2 3 4 5 1 9 6 7 8
          | 6 5 4 3 2 1 | | | | 0 | | | |
          | | | | | | | | | | | | | | | |   | A B C D E F G H | Name
MC1    -> * * * * * * - * * - * - - - - -   | @ - - - - - * - | CAS_
MC16   -> - - - - - - - - - - - - - - - -   | @ - - - * - - - | |CTSEQ2:381|REFOFF
MC15   -> * - * * * * - * * - * - - - - -   | @ - - * - - * - | |CTSEQ2:381|~32~
MC14   -> * * * * * * - * * - * - - - - -   | @ * * - * * * * | |CTSEQ2:381|~33~
MC13   -> * * * * * * * * * - * - - - - -   | @ - - - - - * - | |CTSEQ2:381|~34~
MC12   -> * - * * * * - * * - * - - - - -   | @ * * * * - * - | |CTSEQ2:381|~40~
MC11   -> - - - - - - - - - - - * - - - -   | @ * * * * * * * | INIT_
MC2    -> * * * * * * - * * - * - - - - -   | @ - - - - * * * | RAS_
MC3    -> * - * * * * - * * - * - - - - -   | @ - - - - - * - | TRG_
MC4    -> - - - - - - - - - - - - - - - -   | @ - - - - - - - | V_ORDY
MC5    -> * - * * * * - * * - * - - - - -   | @ - - - - * * * | WEN_
MC10   -> - - - - - * - * * * * * - - - -   | @ - - - - - * - | |8COUNT:231|QE
MC9    -> - - - - - * - * * - * * * - - -   | @ - - - * - * - | |7474:233|1Q
MC6    -> - - - - - * - * * - * * - * - -   | @ - - - - - * * | |7474:233|2Q
MC7    -> - - - - - - - * - - - - - - - -   | @ - - - - - * - | |7474:395|2Q
MC8    -> - - - * - * - - - - - - - - - -   | @ - - - - - - - | |7474:486|1Q

@9     -> * - - - - - - * * * * - - - - -   | @ * * * * - * - | ATE
@68    -> - - - - - * - * * - * - - - - -   | * - - * * - * - | BUF_SEL
@1     -> * - * * * * - * * - * * * * * *   | * - - - - - * - | CLK1
@34    -> - - - - - - - - - - - - - - - -   | - - - - - * * * | CT_STR
@66    -> - - - - - - - - - - - - - - - -   | - * * - * * - - | LD_NOP
@36    -> - - - - - - - - - - - - - - - -   | - * - - * * - - | LINE
@25    -> - - - - - - - - - - - - - - - *   | * - - @ - - - - | LOAD1
@35    -> * - * * * * - * * - * - - - - -   | * - - - - * * - | RST1
@32    -> - - - - - - - - - - - - - - - -   | - - - - - * * * | TEST
@2     -> - - - - - - - - - - - - - - - -   | - - - - - * * * | TST_STR
MC112  -> * - * * * * - * * - * - - - - -   | * - - - * - @ - | |CTSEQ2:381|~31~
MC111  -> * - * * * * - * * - * - - - - -   | * * * * * - @ - | |CTSEQ2:381|~39~
MC95   -> * - - * - - - * * - - - - - - -   | * - - * - @ * - | |PACK:405|~7~
MC110  -> - - - - - - - * - * - * - - - -   | * - - - - - @ - | |8COUNT:231|QA
MC109  -> - - - - - - - * - * - * - - - -   | * - - - - - @ - | |8COUNT:231|QB
MC108  -> - - - - - * - * * * * * - - - -   | * - - - - - @ - | |8COUNT:231|QC
MC107  -> - - - - - - - * - * - * - - - -   | * - - - - - @ - | |8COUNT:231|QD
MC78   -> - - - - - * - * * - * - * - - -   | * - - - @ - * - | |7474:217|1Q
MC120  -> - - - - - * - * * - * - - * - -   | * - - - - - * @ | |7474:217|2Q
MC77   -> - - - - - - - - - - - - - - * -   | * - - - @ - - - | |7474:395|1Q
MC75   -> * - - * - - - * * - - - - - - -   | * - - - @ - * - | |7474:406|2Q
MC104  -> - - - - - * - * * - * - - - - -   | * - - - - - @ - | |7474:407|2Q
MC74   -> * - - * - - - * * - - - - - - -   | * - - - @ - * - | |7476:478|2Q
```

Logic Array Block "B":

```
          M M M M M M M M M M M M M
          C C C C C C C C C C C C C
```

```
         3 1 1 3 3 2 2 2 2 2 2 2 2
         2 7 8 1 0 9 8 7 6 5 4 3 2
         | | | | | | | | | | | | |   | A B C D E F G H | Name
MC32  -> - - - - - - - - - - - - -   | - @ * - * - - - | RCRY1
MC17  -> - - - - - - - - - - - - -   | - @ - - - - - - | VADR2
MC18  -> - - - - - - - - - - - - -   | - @ - - - - - - | VADR3
MC31  -> * - - * * * * * - - - - -   | - @ * - - - - - |  |8COUNT: 119|QC
MC30  -> * - - - * * * * - - - - -   | - @ - * - - - - |  |8COUNT: 119|QD
MC29  -> * - - - - * * * - - - - -   | - @ - - * - - - |  |8COUNT: 119|QE
MC28  -> * - - - - - * * - - - - -   | - @ - * - - - - |  |8COUNT: 119|QF
MC27  -> * - - - - - - * - - - - -   | - @ - - * - - - |  |8COUNT: 119|QG
MC26  -> - - - - - - * - - - - - -   | - @ - - - * - - |  |74273: 89|: 12
MC25  -> - - - - - * - - - - - - -   | - @ - - - * - - |  |74273: 89|: 13
MC24  -> - - - - * - - - - - - - -   | - @ - - - * - - |  |74273: 89|: 14
MC23  -> - - - * - - - - - - - - -   | - @ - - - * - - |  |74273: 89|: 15
MC22  -> - - - - - - - * - - - - -   | - @ - - - - - * |  |74273: 90|: 19

@9    -> - * * - - - - - - - - - -   | @ * * * * - * - | ATE
@68   -> - - - - - - - - - - - - -   | * - - * * - * - | BUF_SEL
@1    -> - - - - - - - - - - - - -   | * - - - - - * - | CLK1
@34   -> - - - - - - - - - - - - -   | - - - - - * * * | CT_STR
@66   -> - - - - - - - - * * * * *   | - * * - * * - - | LD_NOP
@36   -> * - - * * * * * - - - - -   | - * - - * * - - | LINE
@42   -> - - - - - - - - - - - * -   | - * - - @ - - - | MB_4
@43   -> - - - - - - - - - - * - -   | - * - - @ - - - | MB_5
@58   -> - - - - - - - - - * - - -   | - * - - - - - @ | MB_6
@59   -> - - - - - - - - * - - - -   | - * - - - - - @ | MB_7
@60   -> - - - - - - - - - - - - *   | - * - - - - - @ | MB_8
@35   -> - - - - - - - - - - - - -   | * - - - - * * - | RST1
@32   -> - - - - - - - - - - - - -   | - - - - - * * * | TEST
@2    -> - - - - - - - - - - - - -   | - - - - - * * * | TST_STR
MC14  -> - - - * * * * * - - - - -   | @ * * - * * * * |  |CTSEQ2: 381|-33-
MC111 -> - * * - - - - - - - - - -   | * * * * * - @ - |  |CTSEQ2: 381|-39-
MC12  -> - * * - - - - - - - - - -   | @ * * * * - * - |  |CTSEQ2: 381|-40-
MC11  -> * - - * * * * * - - - - -   | @ * * * * * * * | INIT
MC80  -> * - - * * * * * - - - - -   | - * - - @ * - - | RCRY0
MC48  -> - - - * * * * * - - - - -   | - * @ - * * - - | RCRY2
MC94  -> * * - * * * * * - - - - -   | - * - - - @ - - |  |8COUNT: 119|QA
MC93  -> * - * * * * * * - - - - -   | - * - - - @ - - |  |8COUNT: 119|QB
MC46  -> - * - - - - - - - - - - -   | - * @ - - - - - |  |8COUNT: 122|QC
MC45  -> - - * - - - - - - - - - -   | - * @ - - - - - |  |8COUNT: 122|QD
MC126 -> - * - - - - - - - - - - -   | - * - - - * - @ |  |8COUNT: 131|QC
MC125 -> - - * - - - - - - - - - -   | - * - - - * - @ |  |8COUNT: 131|QD
MC92  -> - * - - - - - - - - - - -   | - * - - - @ - * |  |8COUNT: 132|QA
MC91  -> - - * - - - - - - - - - -   | - * - - - @ - * |  |8COUNT: 132|QB
```

Logic Array Block "C":

```
         M M M M M M M M M M M M M M M M
         C C C C C C C C C C C C C C C C
         4 3 3 3 4 4 4 4 4 4 4 4 3 3 3 3
         8 3 4 5 7 6 5 4 3 2 1 0 9 8 6 7
         | | | | | | | | | | | | | | | |   | A B C D E F G H | Name
MC48  -> - - - - * * * * * * - - - - - -   | - * @ - * * - - | RCRY2
MC33  -> - - - - - - - - - - - - - - - -   | - - @ - - - - - | VADR0
MC34  -> - - - - - - - - - - - - - - - -   | - - @ - - - - - | VADR1
MC35  -> - - - - - - - - - - - - - - - -   | - - @ - - - - - | VADR4
MC47  -> * - * - * * * * * * - - - - - -   | - - @ - - - - - |  |8COUNT: 122|QB
MC46  -> * - - - - * * * * * - - - - - -   | - * @ - - - - - |  |8COUNT: 122|QC
MC45  -> * - - - - - * * * * - - - - - -   | - * @ - - - - - |  |8COUNT: 122|QD
MC44  -> * - - * - - - * * * - - - - - -   | - - @ - - - - - |  |8COUNT: 122|QE
MC43  -> * - - - - - - - * * - - - - - -   | - - @ * - - - - |  |8COUNT: 122|QF
MC42  -> * - - - - - - - - * - - - - - -   | - - @ - * - - - |  |8COUNT: 122|QG
MC41  -> - - - - - - - - - * - - - - - -   | - - @ - - - - * |  |74273: 90|: 12
MC40  -> - - - - - - - - * - - - - - - -   | - - @ - - - - * |  |74273: 90|: 13
MC39  -> - - - - - - - * - - - - - - - -   | - - @ - - - - * |  |74273: 90|: 14
```

```
MC38 -> - - - - - - * - - - - - - - - - | - - @ - - - - * | |74273:90|:15
MC36 -> - - - - - * - - - - - - - - - - | - - @ - - - - * | |74273:90|:16
MC37 -> - - - - * - - - - - - - - - - - | - - @ - - - - * | |74273:90|:17

@9   -> - * * * - - - - - - - - - - - - | @ * * * * - * - | ATE
@68  -> - - - - - - - - - - - - - - - - | * - - * * - * - | BUF_SEL
@1   -> - - - - - - - - - - - - - - - - | * - - - - - * - | CLK1
@34  -> - - - - - - - - - - - - - - - - | - - - - - * * * | CT_STR
@66  -> - - - - - - - - - - * * * * * * | - * * - * * - - | LD_NOP
@36  -> - - - - - - - - - - - - - - - - | - * - - * * - - | LINE
@62  -> - - - - - - - - - - - - - - - * | - - * - - - - @ | MB_10
@63  -> - - - - - - - - - - - - - - * - | - - * - - - - @ | MB_11
@64  -> - - - - - - - - - - - - - * - - | - - * - - - - @ | MB_12
@65  -> - - - - - - - - - - - - * - - - | - - * - - - - @ | MB_13
@46  -> - - - - - - - - - - - * - - - - | - - * - - @ - - | MB_14
@47  -> - - - - - - - - - - * - - - - - | - - * - - @ - - | MB_15
@35  -> - - - - - - - - - - - - - - - - | * - - - - * * - | RST1
@32  -> - - - - - - - - - - - - - - - - | - - - - - * * * | TEST
@2   -> - - - - - - - - - - - - - - - - | - - - - - * * * | TST_STR
MC14 -> - - - - * * * * * * - - - - - - | @ * * - * * * * | |CTSEQ2:381|-33-
MC111-> - * * * - - - - - - - - - - - - | * * * * * - @ - | |CTSEQ2:381|-39-
MC12 -> - * * * - - - - - - - - - - - - | @ * * * * - * - | |CTSEQ2:381|-40-
MC11 -> - - - - * * * * * * - - - - - - | @ * * * * * * * | INIT
MC32 -> * - - - * * * * * * - - - - - - | - @ * - * - - - | RCRY1
MC31 -> - - - * - - - - - - - - - - - - | - @ * - - - - - | |8COUNT:119|QC
MC79 -> * * - - * * * * * * - - - - - - | - - * - @ - - - | |8COUNT:122|QA
MC128-> - * - - - - - - - - - - - - - - | - - * - - * - @ | |8COUNT:131|QA
MC127-> - - * - - - - - - - - - - - - - | - - * - - * - @ | |8COUNT:131|QB
MC124-> - - - * - - - - - - - - - - - - | - - * - - * - @ | |8COUNT:131|QE
MC90 -> - - - * - - - - - - - - - - - - | - - * - - @ - * | |8COUNT:132|QC
MC86 -> - * - - - - - - - - - - - - - - | - - * - - @ - * | |74161:22|QA
MC85 -> - - * - - - - - - - - - - - - - | - - * - - @ - * | |74161:22|QB
MC84 -> - * - - - - - - - - - - - - - - | - - * - * @ - - | |74161:450|QA
MC67 -> - - * - - - - - - - - - - - - - | - - * - @ - - - | |74161:450|QB
```

Logic Array Block "D":

```
         M M M M M
         C C C C C
         5 5 5 5 6
         1 2 3 4 4
         | | | | | | A B C D E F G H | Name
MC51 ->  - - - - - | - - - @ - - - - | LOWER_SI
MC52 ->  - - - - - | - - - @ - - - - | UPPER_SI
MC53 ->  - - - - - | - - - @ - - - - | VADR5
MC54 ->  - - - - - | - - - @ - - - - | VADR7
MC64 ->  * * - - * | - - - @ - - - - | |7476:478|1Q

@9   ->  * * * * - | @ * * * * - * - | ATE
@68  ->  - - * * - | * - - * * - * - | BUF_SEL
@1   ->  - - - - - | * - - - - - * - | CLK1
@34  ->  - - - - - | - - - - - * * * | CT_STR
@66  ->  - - - - - | - * * - * * - - | LD_NOP
@36  ->  - - - - - | - * - - * * - - | LINE
@35  ->  - - - - - | * - - - - * * - | RST1
@32  ->  - - - - - | - - - - - * * * | TEST
@2   ->  - - - - - | - - - - - * * * | TST_STR
MC15 ->  * * - - * | @ - - * - - * - | |CTSEQ2:381|-32-
MC111->  - - * * - | * * * * * - @ - | |CTSEQ2:381|-39-
MC12 ->  - - * * - | @ * * * * - * - | |CTSEQ2:381|-40-
MC11 ->  - - - - * | @ * * * * * * * | INIT
MC95 ->  - - - - * | * - - * - @ * - | |PACK:405|-7-
MC30 ->  - - * - - | - @ - * - - - - | |8COUNT:119|QD
MC28 ->  - - - * - | - @ - * - - - - | |8COUNT:119|QF
MC43 ->  - - * - - | - - @ * - - - - | |8COUNT:122|QF
MC123->  - - * - - | - - - * - * - @ | |8COUNT:131|QF
```

```
MC89 -> - - * - - | - - - * - @ - * |  |8COUNT: 132|QD
MC87 -> - - - * - | - - - * - @ - * |  |8COUNT: 132|QF
MC73 -> - - * * - | - - - * @ - - - |  |74161: 40|QA
MC69 -> - - - * - | - - - * @ - - - |  |74161: 40|QC
MC116-> - - * * - | - - - * - - - @ |  |74161: 127|QA
MC114-> - - - * - | - - - * - - - @ |  |74161: 127|QC
```

Logic Array Block "E":

```
         M M M M M M M M M M M M M M M M
         C C C C C C C C C C C C C C C C
         8 7 7 7 7 7 7 7 7 7 7 6 6 6 6 6
         0 1 2 9 8 7 6 5 4 3 0 9 8 7 6 5
         | | | | | | | | | | | | | | | |   A B C D E F G H   Name
MC80 ->  - - - - * - - - - * * * * * - -   - * - - @ * - -   RCRY0
MC71 ->  - - - - - - - - - - - - - - - -   - - - - @ - - -   VADR6
MC72 ->  - - - - - - - - - - - - - - - -   - - - - @ - - -   VADR8
MC79 ->  - - - * - - - - - - - - - - - -   - - * - @ - - -   |8COUNT: 122|QA
MC78 ->  - - - - - - - - - - - - - - - -   * - - - @ - * -   |7474: 217|1Q
MC77 ->  - - - - - - - - - - - - - - - -   * - - - @ - - -   |7474: 395|1Q
MC76 ->  - - - - - - - - - - - - - - - -   - - - - @ - * -   |7474: 406|1Q
MC75 ->  - - - - - - - - - - - - - - - -   * - - - @ - * -   |7474: 406|2Q
MC74 ->  - - - - - - - - * - - - - - - -   * - - - @ - * -   |7476: 478|2Q
MC73 ->  - - - - - - - - - * * * * - - -   - - - * @ - - -   |74161: 40|QA
MC70 ->  - * * - - - - - - - * * * - - -   - - - - @ - - -   |74161: 40|QB
MC69 ->  - - - - - - - - - - - * * - - -   - - - * @ - - -   |74161: 40|QC
MC68 ->  - - * - - - - - - - - - * - - -   - - - - @ - - -   |74161: 40|QD
MC67 ->  * - - - - - - - - - - - - * - -     - * - @ - - -   |74161: 450|QB
MC66 ->  - - - - - - - - - - - - - * - -   - - - - @ * - -   |74273: 89|: 18
MC65 ->  - - - * - - - - - - - - - - - -   - - - - @ - - *   |74273: 90|: 18

@9   ->  - * * - - - - - - - - - - - - -   @ * * * * - * -   ATE
@68  ->  - * * - - - - - - - - - - - - -   * - - * * - * -   BUF_SEL
@24  ->  - - - - - * - - - - - - - - - -   - - - @ * - - -   BUF_SO
@1   ->  - - - - - - - - - - - - - - - -   * - - - - - * -   CLK1
@34  ->  - - - - - - - - - - - - - - - -   - - - - - * * *   CT_STR
@66  ->  - - - - - - - - - - - - - - * *   - * * - * * - -   LD_NOP
@36  ->  * - - - * - - - - * * * * * - -   - * - - * * - -   LINE
@39  ->  - - - - - - - - - - - - - - * -   - - - - @ - - -   MB_1
@61  ->  - - - - - - - - - - - - - - - *   - - - - * - - @   MB_9
@49  ->  - - - - - - * - - - - - - - - -   - - - - * @ - -   REF_ON
@35  ->  - - - - - - - - - - - - - - - -   * - - - - * * -   RST1
@32  ->  - - - - - - - - - - - - - - - -   - - - - - * * *   TEST
@2   ->  - - - - - - - - - - - - - - - -   - - - - - * * *   TST_STR
MC16 ->  - - - - - - * - - - - - - - - -   @ - - - * - - -   |CTSEQ2: 381|REFOFF
MC112->  - - - - - - - - * - - - - - - -   * - - - * - @ -   |CTSEQ2: 381|-31-
MC14 ->  - - - * * * - * * * * * * * - -   @ * * - * * * *   |CTSEQ2: 381|-33-
MC111->  - * * - - - - * - - - - - - - -   * * * * * - @ -   |CTSEQ2: 381|-39-
MC12 ->  - * * - - - - - - - - - - - - -   @ * * * * - * -   |CTSEQ2: 381|-40-
MC11 ->  - - - * * * - - * * * * * * - -   @ * * * * * * *   INIT_
MC32 ->  - - - * - - - * - - - - - - - -   - @ * - * - - -   RCRY1
MC48 ->  * - - * * - - - - * * * * * - -   - * @ - * * - -   RCRY2
MC29 ->  - * - - - - - - - - - - - - - -   - @ - - * - - -   |8COUNT: 119|QE
MC27 ->  - - * - - - - - - - - - - - - -   - @ - - * - - -   |8COUNT: 119|QG
MC42 ->  - * - - - - - - - - - - - - - -   - - @ - * - - -   |8COUNT: 122|QG
MC122->  - * - - - - - - - - - - - - - -   - - - - * * - @   |8COUNT: 131|QG
MC88 ->  - * - - - - - - - - - - - - - -   - - - - * @ - *   |8COUNT: 132|QE
MC121->  - - * - - - - - - - - - - - - -   - - - - * - - @   |8COUNT: 132|QG
MC9  ->  - - - - * - - - - - - - - - - -   @ - - - * - * -   |7474: 233|1Q
MC115->  - * * - - - - - - - - - - - - -   - - - - * - - @   |74161: 127|QB
MC113->  - - * - - - - - - - - - - - - -   - - - - * - - @   |74161: 127|QD
MC84 ->  * - - - - - - - - - - - - * - -   - - * - * @ - -   |74161: 450|QA
```

Logic Array Block "F":

```
         M M M M M M M M M M M M M M M M
         C C C C C C C C C C C C C C C C
```

| | 96 | 95 | 94 | 93 | 92 | 91 | 90 | 89 | 88 | 87 | 86 | 85 | 84 | 83 | 82 | 81 | A | B | C | D | E | F | G | H | Name | |
|---|---|---|---|---|---|---|---|---|---|---|---|---|---|---|---|---|---|---|---|---|---|---|---|---|---|---|
| MC96 -> | * | * | - | - | - | - | - | - | - | - | - | - | - | - | - | - | - | - | - | - | - | @ | - | - | PACK: 405 | -6- |
| MC95 -> | * | * | - | - | - | - | - | - | - | - | - | - | - | - | - | - | * | - | - | * | - | @ | * | - | PACK: 405 | -7- |
| MC94 -> | - | - | * | * | - | - | - | - | - | - | - | - | - | - | - | - | - | * | - | - | - | @ | - | - | 8COUNT: 119 | QA |
| MC93 -> | - | - | - | * | - | - | - | - | - | - | - | - | - | - | - | - | - | * | - | - | - | @ | - | - | 8COUNT: 119 | QB |
| MC92 -> | - | - | - | - | * | * | * | * | * | * | - | - | - | - | - | - | - | * | - | - | - | @ | - | * | 8COUNT: 132 | QA |
| MC91 -> | - | - | - | - | - | * | * | * | * | * | - | - | - | - | - | - | - | * | - | - | - | @ | - | * | 8COUNT: 132 | QB |
| MC90 -> | - | - | - | - | - | - | * | * | * | * | - | - | - | - | - | - | - | - | * | - | - | @ | - | * | 8COUNT: 132 | QC |
| MC89 -> | - | - | - | - | - | - | - | * | * | * | - | - | - | - | - | - | - | - | - | * | - | @ | - | * | 8COUNT: 132 | QD |
| MC88 -> | - | - | - | - | - | - | - | - | * | * | - | - | - | - | - | - | - | - | - | - | * | @ | - | * | 8COUNT: 132 | QE |
| MC87 -> | - | - | - | - | - | - | - | - | - | * | - | - | - | - | - | - | - | - | - | * | - | @ | - | * | 8COUNT: 132 | QF |
| MC86 -> | - | - | - | - | * | * | * | * | * | * | * | * | - | - | - | - | - | - | * | - | - | @ | - | * | 74161: 22 | QA |
| MC85 -> | - | - | - | - | * | * | * | * | * | * | * | * | - | - | - | - | - | - | * | - | - | @ | - | * | 74161: 22 | QB |
| MC84 -> | - | - | - | - | - | - | - | - | - | - | - | - | * | - | - | - | - | - | * | - | * | @ | - | - | 74161: 450 | QA |
| MC83 -> | - | - | - | * | - | * | - | - | - | - | - | - | - | - | - | - | - | - | - | - | - | @ | - | - | 74273: 89 | : 16 |
| MC82 -> | * | * | * | - | * | - | - | - | - | - | - | - | - | - | - | - | - | - | - | - | - | @ | - | - | 74273: 89 | : 17 |
| MC81 -> | * | * | - | - | - | - | - | - | - | - | * | - | * | - | - | - | - | - | - | - | - | @ | - | * | 74273: 89 | : 19 |
| @68 -> | - | - | - | - | - | - | - | - | - | - | - | - | - | - | - | - | * | - | - | * | * | - | * | - | BUF_SEL | |
| @1 -> | - | - | - | - | - | - | - | - | - | - | - | - | - | - | - | - | * | - | - | - | - | - | * | - | CLK1 | |
| @34 -> | - | - | - | - | * | * | * | * | * | * | * | * | - | - | - | - | - | - | - | - | - | * | * | * | CT_STR | |
| @66 -> | - | - | - | - | - | - | - | - | - | - | - | - | - | * | * | * | - | * | * | - | * | * | - | - | LD_NOP | |
| @36 -> | * | * | * | * | - | - | - | - | - | - | - | - | * | - | - | - | - | * | - | - | * | * | - | - | LINE | |
| @38 -> | - | - | - | - | - | - | - | - | - | - | - | - | - | - | - | * | - | - | - | - | @ | * | - | - | MB_0 | |
| @40 -> | - | - | - | - | - | - | - | - | - | - | - | - | - | - | * | - | - | - | - | - | @ | * | - | - | MB_2 | |
| @41 -> | - | - | - | - | - | - | - | - | - | - | - | - | - | * | - | - | - | - | - | - | @ | * | - | - | MB_3 | |
| @48 -> | * | * | - | - | - | - | - | - | - | - | - | - | - | - | - | - | - | - | - | - | - | @ | - | - | ODDADD | |
| @35 -> | * | * | - | - | - | - | - | - | - | - | - | - | - | - | - | - | * | - | - | - | - | * | * | - | RST1 | |
| @32 -> | - | - | - | - | * | * | * | * | * | * | * | * | - | - | - | - | - | - | - | - | - | * | * | * | TEST | |
| @2 -> | - | - | - | - | * | * | * | * | * | * | * | * | - | - | - | - | - | - | - | - | - | * | * | * | TST_STR | |
| @51 -> | * | * | - | - | - | - | - | - | - | - | - | - | - | - | - | - | - | - | - | - | - | @ | - | - | UNPACK | |
| MC14 -> | * | * | * | * | * | * | * | * | * | * | * | * | * | - | - | - | @ | * | * | - | * | * | * | * | CTSEQ2: 381 | -33- |
| MC11 -> | * | * | * | * | * | * | * | * | * | * | * | * | * | - | - | - | @ | * | * | * | * | * | * | * | INIT_ | |
| MC2 -> | - | - | - | - | * | * | * | * | * | * | - | - | - | - | - | - | @ | - | - | - | - | * | * | * | RAS_ | |
| MC80 -> | - | - | * | * | - | - | - | - | - | - | - | - | * | - | - | - | - | * | - | - | @ | * | - | - | RCRY0 | |
| MC48 -> | * | * | * | * | - | - | - | - | - | - | - | - | * | - | - | - | - | * | @ | - | * | * | - | - | RCRY2 | |
| MC5 -> | - | - | - | - | * | * | * | * | * | * | - | - | - | - | - | - | @ | - | - | - | - | * | * | * | WEN_ | |
| MC128-> | - | - | - | - | * | * | * | * | * | * | - | - | - | - | - | - | - | - | * | - | - | * | - | @ | 8COUNT: 131 | QA |
| MC127-> | - | - | - | - | * | * | * | * | * | * | - | - | - | - | - | - | - | - | * | - | - | * | - | @ | 8COUNT: 131 | QB |
| MC126-> | - | - | - | - | * | * | * | * | * | * | - | - | - | - | - | - | - | * | - | - | - | * | - | @ | 8COUNT: 131 | QC |
| MC125-> | - | - | - | - | * | * | * | * | * | * | - | - | - | - | - | - | - | * | - | - | - | * | - | @ | 8COUNT: 131 | QD |
| MC124-> | - | - | - | - | * | * | * | * | * | * | - | - | - | - | - | - | - | - | * | - | - | * | - | @ | 8COUNT: 131 | QE |
| MC123-> | - | - | - | - | * | * | * | * | * | * | - | - | - | - | - | - | - | - | - | * | - | * | - | @ | 8COUNT: 131 | QF |
| MC122-> | - | - | - | - | * | * | * | * | * | * | - | - | - | - | - | - | - | - | - | - | * | * | - | @ | 8COUNT: 131 | QG |
| MC117-> | - | - | - | - | * | * | * | * | * | * | - | - | - | - | - | - | - | - | - | - | - | * | - | @ | 7476: 329 | 2Q |
| MC26 -> | - | - | - | - | - | - | - | - | - | * | - | - | - | - | - | - | - | @ | - | - | - | * | - | - | 74273: 89 | : 12 |
| MC25 -> | - | - | - | - | - | - | - | - | * | - | - | - | - | - | - | - | - | @ | - | - | - | * | - | - | 74273: 89 | : 13 |
| MC24 -> | - | - | - | - | - | - | - | * | - | - | - | - | - | - | - | - | - | @ | - | - | - | * | - | - | 74273: 89 | : 14 |
| MC23 -> | - | - | - | - | - | - | * | - | - | - | - | - | - | - | - | - | - | @ | - | - | - | * | - | - | 74273: 89 | : 15 |
| MC66 -> | - | - | - | - | - | - | - | - | - | - | - | * | - | - | - | - | - | - | - | - | @ | * | - | - | 74273: 89 | : 18 |

Logic Array Block "G":

| | MC112 | MC111 | MC98 | MC100 | MC101 | MC110 | MC109 | MC108 | MC107 | MC106 | MC105 | MC104 | A | B | C | D | E | F | G | H | Name | |
|---|---|---|---|---|---|---|---|---|---|---|---|---|---|---|---|---|---|---|---|---|---|---|
| MC112-> | * | * | - | - | - | - | - | - | - | - | - | - | * | - | - | - | * | - | @ | - | CTSEQ2: 381 | -31- |
| MC111-> | * | * | - | - | - | - | - | - | - | - | - | - | * | * | * | * | * | - | @ | - | CTSEQ2: 381 | -39- |
| MC98 -> | - | - | * | - | - | - | - | - | - | - | - | - | - | - | - | - | - | - | @ | - | SEN | |
| MC100-> | - | - | - | - | - | - | - | - | - | - | - | - | - | - | - | - | - | - | @ | - | V_IRDY_ | |
| MC101-> | - | - | - | - | - | - | - | - | - | - | - | - | - | - | - | - | - | - | @ | - | V_SCLK_ | |
| MC110-> | * | * | - | - | - | * | * | * | * | - | - | - | * | - | - | - | - | - | @ | - | 8COUNT: 231 | QA |
| MC109-> | * | * | - | - | - | - | * | * | * | - | - | - | * | - | - | - | - | - | @ | - | 8COUNT: 231 | QB |

```
MC108-> * * - * - - - * * - - -   | * - - - - - @ -   | |8COUNT: 231|QC
MC107-> * * - - - - - - * - - -   | * - - - - - @ -   | |8COUNT: 231|QD
MC106-> - - - * - - - - - - * -   | - - - - - - @ *   | |7474: 245|2Q
MC105-> - - - * * - - - - - - -   | - - - - - - @ -   | |7474: 375|1Q
MC104-> * * - - - - - - - - - -   | * - - - - - @ -   | |7474: 407|2Q

@9    -> - - * * * - - - - - - -  | @ * * * * - * -   | ATE
@68   -> * * - * - - - - - - - -  | * - - * * - * -   | BUF_SEL
@1    -> * * * - - * * * * * * *  | * - - - - - * -   | CLK1
@34   -> - - - * * - - - - * - -  | - - - - - * * *   | CT_STR
@66   -> - - - - - - - - - - - -  | - * * - * * - -   | LD_NOP
@36   -> - - - - - - - - - - - -  | - * - - * * - -   | LINE
@35   -> * * - - - - - - - - - -  | * - - - - * * -   | RST1
@32   -> - - - * * - - - - * - -  | - - - - - * * *   | TEST
@2    -> - - - - * - - - - * - -  | - - - - - * * *   | TST_STR
MC1   -> * * - - - - - - - - - -  | @ - - - - - * -   | CAS_
MC15  -> * * - - - - - - - - - -  | @ - - * - - * -   |  |CTSEQ2: 381|-32-
MC14  -> * * - - * - - - - * - -  | @ * * - * * * *   |  |CTSEQ2: 381|-33-
MC13  -> * * - - - - - - - - - -  | @ - - - - - * -   |  |CTSEQ2: 381|-34-
MC12  -> * * - - - - - - - - - -  | @ * * * * - * -   |  |CTSEQ2: 381|-40-
MC11  -> - - * * * * * * * * - -  | @ * * * * * * *   | INIT_
MC95  -> * * - - - - - - - - - -  | * - - * - @ * -   |  |PACK: 405|-7-
MC2   -> * * * - - - - - - - - -  | @ - - - - * * *   | RAS_
MC3   -> * * - - - - - - - - - -  | @ - - - - - * -   | TRG_
MC5   -> * * - * - - - - - - - -  | @ - - - - * * *   | WEN_
MC10  -> * * - * - - - - - - - -  | @ - - - - - * -   |  |8COUNT: 231|QE
MC78  -> * * - - - - - - - - - -  | * - - - @ - * -   |  |7474: 217|1Q
MC120-> * * - - - - - - - - - -   | * - - - - - * @   |  |7474: 217|2Q
MC9   -> * * - - - * * * * - - -  | @ - - - * - * -   |  |7474: 233|1Q
MC6   -> * * - - - * * * * - - -  | @ - - - - - * *   |  |7474: 233|2Q
MC119-> - - - * - - - - - * - -   | - - - - - - * @   |  |7474: 245|1Q
MC7   -> * * - - - - - - - - - -  | @ - - - - - * -   |  |7474: 395|2Q
MC76  -> * * - - - - - - - - - -  | - - - - @ - * -   |  |7474: 406|1Q
MC75  -> - * - - - - - - - - - -  | * - - - @ - * -   |  |7474: 406|2Q
MC118-> - - - * - - - - - - - *   | - - - - - - * @   |  |7474: 407|1Q
MC74  -> * * - - - - - - - - - -  | * - - - @ - * -   |  |7476: 478|2Q
```

Logic Array Block "H":

```
        M M M M M M M M M M M M M M M M
        C C C C C C C C C C C C C C C C
        1 1 1 1 1 1 1 1 1 1 1 1 1 1 1 1
        2 2 2 2 2 2 2 2 2 1 1 1 1 1 1 1
        8 7 6 5 4 3 2 1 0 9 8 7 6 5 4 3 | A B C D E F G H | Name
MC128-> * * * * * * * * * - - - * * * * | - - * - - * - @ | |8COUNT: 131|QA
MC127-> * * * * * * * * * - - - * * * * | - - * - - * - @ | |8COUNT: 131|QB
MC126-> * * * * * * * * * - - - * * * * | - * - - - * - @ | |8COUNT: 131|QC
MC125-> * * * * * * * * * - - - * * * * | - * - - - * - @ | |8COUNT: 131|QD
MC124-> * * * * * * * * * - - - * * * * | - - * - - * - @ | |8COUNT: 131|QE
MC123-> * * * * * * * * * - - - * * * * | - - - * - * - @ | |8COUNT: 131|QF
MC122-> * * * * * * * * * - - - * * * * | - - - - * * - @ | |8COUNT: 131|QG
MC121-> * * * * * * * * - * * * * * * * | - - - - * - - @ | |8COUNT: 132|QG
MC120-> - - - - - - - - - - - - - - - - | * - - - - - * @ | |7474: 217|2Q
MC119-> - - - - - - - - - - - - - - - - | - - - - - - * @ | |7474: 245|1Q
MC118-> - - - - - - - - * - - - - - - - | - - - - - - * @ | |7474: 407|1Q
MC117-> * * * * * * * * * - - * * * * * | - - - - - * - @ | |7476: 329|2Q
MC116-> - - - - - - - - - - - - * * * * | - - - * - - - @ | |74161: 127|QA
MC115-> - - - - - - - - - - - - - * * * | - - - - * - - @ | |74161: 127|QB
MC114-> - - - - - - - - - - - - - - * * | - - - * - - - @ | |74161: 127|QC
MC113-> - - - - - - - - - - - - - - - * | - - - - * - - @ | |74161: 127|QD

@68   -> - - - - - - - - - - - - - - - - | * - - * * - * - | BUF_SEL
@1    -> - - - - - - - - - - - - - - - - | * - - - - - * - | CLK1
@34   -> * * * * * * * * - * * * * * * * | - - - - - * * * | CT_STR
@66   -> - - - - - - - - - - - - - - - - | - * * - * * - - | LD_NOP
@36   -> - - - - - - - - - - - - - - - - | - * - - * * - - | LINE
```

```
@35   -> - - - - - - - - - - - - - - - - | * - - - - * * - | RST1
@32   -> * * * * * * * * - * * * * * * * | - - - - - * * * | TEST
@2    -> * * * * * * * * - * * * * * * * | - - - - - * * * | TST_STR
MC14  -> * * * * * * * * - * * * * * * * | @ * * - * * * * | |CTSEQ2:381|-33-
MC11  -> * * * * * * * * * * * * * * * * | @ * * * * * * * | INIT_
MC2   -> - - - - - - - * - - - - - - - - | @ - - - - * * * | RAS_
MC5   -> - - - - - - - * - - * - - - - - | @ - - - - * * * | WEN_
MC92  -> * * * * * * * * - * * * * * * * | - * - - - @ - * | |8COUNT:132|QA
MC91  -> * * * * * * * * - * * * * * * * | - * - - - @ - * | |8COUNT:132|QB
MC90  -> * * * * * * * * - * * * * * * * | - - * - - @ - * | |8COUNT:132|QC
MC89  -> * * * * * * * * - * * * * * * * | - - - * - @ - * | |8COUNT:132|QD
MC88  -> * * * * * * * * - * * * * * * * | - - - - * @ - * | |8COUNT:132|QE
MC87  -> * * * * * * * * - * * * * * * * | - - - * - @ - * | |8COUNT:132|QF
MC6   -> - - - - - - - - * - - - - - - - | @ - - - - - * * | |7474:233|2Q
MC106-> - - - - - - - - - * - - - - - - | - - - - - - @ * | |7474:245|2Q
MC86  -> * * * * * * * * - * * * * * * * | - - * - - @ - * | |74161:22|QA
MC85  -> * * * * * * * * - * * * * * * * | - - * - - @ - * | |74161:22|QB
MC81  -> - - - - - - - - - * - - - - - - | - - - - - @ - * | |74273:89|:19
MC41  -> - - - - - - * - - - - - - - - - | - - @ - - - - * | |74273:90|:12
MC40  -> - - - - - * - - - - - - - - - - | - - @ - - - - * | |74273:90|:13
MC39  -> - - - - * - - - - - - - - - - - | - - @ - - - - * | |74273:90|:14
MC38  -> - - - * - - - - - - - - - - - - | - - @ - - - - * | |74273:90|:15
MC36  -> - - * - - - - - - - - - - - - - | - - @ - - - - * | |74273:90|:16
MC37  -> - * - - - - - - - - - - - - - - | - - @ - - - - * | |74273:90|:17
MC65  -> * - - - - - - - - - - - - - - - | - - - - @ - - * | |74273:90|:18
MC22  -> - - - - - - - * - - - - - - - - | - @ - - - - - * | |74273:90|:19

BUF_SEL  : INPUT;
LINE_    : INPUT;
MB_2     : INPUT;
LD_NOP   : INPUT;
UNPACK   : INPUT;
ODDADD   : INPUT;
MB_0     : INPUT;
RST1     : INPUT;
CLK1     : INPUT;
REF_ON   : INPUT;
TEST     : INPUT;
TST_STR  : INPUT;
CT_STR   : INPUT;
MB_9     : INPUT;
MB_10    : INPUT;
MB_11    : INPUT;
MB_12    : INPUT;
MB_13    : INPUT;
MB_14    : INPUT;
MB_15    : INPUT;
MB_3     : INPUT;
MB_4     : INPUT;
MB_5     : INPUT;
MB_6     : INPUT;
MB_7     : INPUT;
MB_8     : INPUT;
BUF_SO   : INPUT;
LOAD1    : INPUT;
MB_1     : INPUT;
ATE      : INPUT;

CAS_    = TRI(  _MC001, !ATE);
 _MC001 = DFF(  _EQ001 $  _EQ002, SCLK( CLK1 ),  RST1,  VCC );
  _EQ001 =  _MC001 & !_MC002 & !_MC003 &  _MC005 & !_MC012 &  _MC013 &
           !_MC014 & !_MC015 &  _MC074 & !_MC075 & !_MC095 & !_MC111 &
           !_MC112 &  _X001 &  _X002
        # !_MC001 & !_MC002 & !_MC003 &  _MC005 & !_MC012 &  _MC013 &
            _MC014 & !_MC015 & !_MC111 & !_MC112 &  _X001 &  _X002
        #  _MC001 & !_MC002 & !_MC003 & !_MC005 &  _MC012 &  _MC013 &
```

```
        !_MC014 & !_MC015 & !_MC111 & !_MC112 &  _X001 &  _X002;
_X001  = EXP( !_MC001 &  _MC003 &  _MC005 &  _MC012 &  _MC013 & !_MC014 &
        !_MC015 &  _MC111 & !_MC112 );
_X002  = EXP(  _MC001 &  _MC003 &  _MC005 & !_MC012 &  _MC013 & !_MC014 &
        !_MC015 & !_MC111 & !_MC112 );
_EQ002 =  _X001 &  _X002;

RAS_     = TRI(  _MC002, !ATE);
 _MC002  = DFF(  _EQ003 $  _EQ004, SCLK( CLK1 ),  RST1,  VCC );
 _EQ003 =  _MC001 &  _MC002 &  _MC003 &  _MC005 & !_MC006 &  _MC007 &
          !_MC009 &  _MC010 & !_MC012 &  _MC013 & !_MC014 & !_MC015 &
          !_MC078 &  _MC111 &  _MC112 & !_MC120 &  _X003
       #  _MC001 &  _MC002 &  _MC003 &  _MC005 & !_MC006 &  _MC007 &
          !_MC009 & !_MC012 &  _MC013 & !_MC014 & !_MC015 & !_MC078 &
           _MC108 &  _MC111 &  _MC112 & !_MC120 &  _X004
       #  _MC001 &  _MC002 &  _MC003 &  _MC005 & !_MC006 &  _MC007 &
          !_MC009 & !_MC012 &  _MC013 & !_MC014 & !_MC015 & !_MC078 &
          !_MC104 &  _MC111 &  _MC112 & !_MC120 &  _X005;
 _X003  = EXP( !BUF_SEL &  _MC104 );
 _X004  = EXP(  BUF_SEL &  _MC104 );
 _X005  = EXP( !_MC107 & !_MC109 & !_MC110 );
 _EQ004 =  _X001 &  _X006 &  _X007 &  _X008 &  _X009 &  _X010 &  _X011 &
           _X012 &  _X013 &  _X014 &  _X015 &  _X016 &  _X017 &  _X018 &
           _X019 &  _X020;
 _X006  = EXP(  _MC001 &  _MC003 &  _MC005 & !_MC012 &  _MC013 & !_MC014 &
          !_MC015 &  _MC111 & !_MC112 );
 _X007  = EXP( !BUF_SEL &  _MC001 &  _MC002 &  _MC003 &  _MC005 &  _MC006 &
           _MC007 &  _MC009 & !_MC012 &  _MC013 & !_MC014 & !_MC015 &
          !_MC078 &  _MC108 &  _MC111 &  _MC112 & !_MC120 );
 _X008  = EXP(  _MC001 & !_MC003 & !_MC005 &  _MC012 &  _MC013 & !_MC014 &
          !_MC015 &  _MC111 & !_MC112 );
 _X009  = EXP(  _MC001 & !_MC002 & !_MC003 & !_MC005 &  _MC012 &  _MC013 &
          !_MC014 & !_MC015 & !_MC111 & !_MC112 );
 _X010  = EXP( !_MC001 & !_MC002 &  _MC003 &  _MC005 &  _MC012 &  _MC013 &
          !_MC014 & !_MC015 & !_MC111 & !_MC112 );
 _X011  = EXP(  _MC001 &  _MC002 &  _MC003 &  _MC005 &  _MC006 &  _MC007 &
           _MC009 & !_MC012 &  _MC013 & !_MC014 & !_MC015 & !_MC078 &
          !_MC104 &  _MC110 &  _MC111 &  _MC112 & !_MC120 );
 _X012  = EXP(  _MC001 &  _MC002 &  _MC003 &  _MC005 &  _MC006 &  _MC007 &
           _MC009 & !_MC012 &  _MC013 & !_MC014 & !_MC015 & !_MC078 &
          !_MC104 &  _MC109 &  _MC111 &  _MC112 & !_MC120 );
 _X013  = EXP(  _MC001 &  _MC002 &  _MC003 &  _MC005 &  _MC006 &  _MC007 &
           _MC009 & !_MC012 &  _MC013 & !_MC014 & !_MC015 & !_MC078 &
          !_MC104 &  _MC108 &  _MC111 &  _MC112 & !_MC120 );
 _X014  = EXP(  _MC001 &  _MC002 &  _MC003 &  _MC005 &  _MC006 &  _MC007 &
           _MC009 & !_MC012 &  _MC013 & !_MC014 & !_MC015 & !_MC078 &
          !_MC104 &  _MC107 &  _MC111 &  _MC112 & !_MC120 );
 _X015  = EXP(  _MC001 &  _MC002 &  _MC003 &  _MC005 &  _MC006 &  _MC007 &
           _MC009 &  _MC010 & !_MC012 &  _MC013 & !_MC014 & !_MC015 &
          !_MC078 & !_MC104 &  _MC111 &  _MC112 & !_MC120 );
 _X016  = EXP(  _MC001 & !_MC002 & !_MC003 &  _MC005 & !_MC012 &  _MC013 &
          !_MC014 & !_MC015 &  _MC074 & !_MC075 & !_MC095 & !_MC111 &
          !_MC112 );
 _X017  = EXP(  BUF_SEL &  _MC001 &  _MC002 &  _MC003 &  _MC005 &  _MC006 &
           _MC007 &  _MC009 &  _MC010 & !_MC012 &  _MC013 & !_MC014 &
          !_MC015 & !_MC078 &  _MC111 &  _MC112 & !_MC120 );
 _X018  = EXP(  _MC001 & !_MC002 &  _MC003 &  _MC005 & !_MC012 &  _MC013 &
          !_MC014 & !_MC015 & !_MC111 & !_MC112 );
 _X019  = EXP( !_MC001 & !_MC002 & !_MC003 &  _MC005 & !_MC012 &  _MC013 &
          !_MC014 &  _MC015 & !_MC111 & !_MC112 );
 _X020  = EXP( !_MC001 & !_MC002 & !_MC003 &  _MC005 & !_MC012 &  _MC013 &
           _MC014 & !_MC015 & !_MC111 & !_MC112 );

TRG_     = TRI(  _MC003, !ATE);
 _MC003  = DFF(  _EQ005 $  _EQ006, SCLK( CLK1 ),  RST1,  VCC );
```

```
 _EQ005 =  BUF_SEL &  _MC001 &  _MC002 &  _MC003 &  _MC005 &  _MC006 &
           _MC009 & !_MC010 & !_MC012 &  _MC013 & !_MC014 & !_MC015 &
          !_MC078 &  _MC104 &  _MC111 &  _MC112 & !_MC120 &  _X008 &
           _X018 &  _X019 &  _X020 &  _X021 &  _X022
        # !BUF_SEL &  _MC001 &  _MC002 &  _MC003 &  _MC005 &  _MC006 &
           _MC009 & !_MC012 &  _MC013 & !_MC014 & !_MC015 & !_MC078 &
           _MC104 & !_MC108 &  _MC111 &  _MC112 & !_MC120 &  _X008 &
           _X018 &  _X019 &  _X020 &  _X021 &  _X022
        #  BUF_SEL &  _MC001 &  _MC002 &  _MC003 &  _MC005 & !_MC006 &
          !_MC009 & !_MC010 & !_MC012 &  _MC013 & !_MC014 & !_MC015 &
          !_MC078 &  _MC104 &  _MC111 &  _MC112 & !_MC120 &  _X008 &
           _X018 &  _X019 &  _X020 &  _X021 &  _X022;
 _X021  = EXP( !BUF_SEL &  _MC001 &  _MC002 &  _MC003 &  _MC005 & !_MC006 &
          !_MC009 & !_MC012 &  _MC013 & !_MC014 & !_MC015 & !_MC078 &
           _MC104 & !_MC108 &  _MC111 &  _MC112 & !_MC120 );
 _X022  = EXP(  _MC001 & !_MC002 &  _MC005 & !_MC012 &  _MC013 & !_MC014 &
          !_MC015 &  _MC074 & !_MC075 & !_MC095 & !_MC111 & !_MC112 );
 _EQ006 =  _X008 &  _X018 &  _X019 &  _X020 &  _X021 &  _X022;

V_ORDY  = TRI(  _MC004, !ATE);
 _MC004 = MCELL(  _EQ007 $  VCC );
 _EQ007 = !_MC010 & !_MC107 & !_MC108 & !_MC109 & !_MC110;

WEN_    = TRI(  _MC005, !ATE);
 _MC005 = DFF(  _EQ008 $  _EQ009, SCLK( CLK1 ),  RST1,  VCC );
 _EQ008 =  BUF_SEL &  _MC001 &  _MC002 &  _MC003 &  _MC005 &  _MC006 &
           _MC009 & !_MC010 & !_MC012 &  _MC013 & !_MC014 & !_MC015 &
          !_MC078 &  _MC104 &  _MC111 &  _MC112 & !_MC120 &  _X008 &
           _X021 &  _X023
        # !BUF_SEL &  _MC001 &  _MC002 &  _MC003 &  _MC005 &  _MC006 &
           _MC009 & !_MC012 &  _MC013 & !_MC014 & !_MC015 & !_MC078 &
           _MC104 & !_MC108 &  _MC111 &  _MC112 & !_MC120 &  _X008 &
           _X021 &  _X023
        #  BUF_SEL &  _MC001 &  _MC002 &  _MC003 &  _MC005 & !_MC006 &
          !_MC009 & !_MC010 & !_MC012 &  _MC013 & !_MC014 & !_MC015 &
          !_MC078 &  _MC104 &  _MC111 &  _MC112 & !_MC120 &  _X008 &
           _X021 &  _X023;
 _X023  = EXP(  _MC001 & !_MC002 & !_MC003 & !_MC005 &  _MC012 &  _MC013 &
          !_MC014 & !_MC015 & !_MC112 );
 _EQ009 =  _X008 &  _X021 &  _X023;

% |7474:233|2Q %
 _MC006 = DFF(  _EQ010 $  GND, SCLK( CLK1 ),  VCC,  VCC );
 _EQ010 = !_MC006 &  _MC120;

% |7474:395|2Q %
 _MC007 = DFF(  _MC077 $  GND, SCLK( CLK1 ),  VCC,  VCC );

% |7474:486|1Q %
 _MC008 = DFF(  LOAD1 $  GND, SCLK( CLK1 ),  VCC,  VCC );

% |7474:233|1Q %
 _MC009 = DFF(  _EQ011 $  GND, SCLK( CLK1 ),  VCC,  VCC );
 _EQ011 = !_MC009 &  _MC078;

% |8COUNT:231|QE %
 _MC010 = DFF(  _EQ012 $  _MC010, SCLK( CLK1 ),  INIT_,  VCC );
 _EQ012 =  _MC006 & !_MC009 &  _MC107 &  _MC108 &  _MC109 &  _MC110
        # !_MC006 &  _MC009 & !_MC107 & !_MC108 & !_MC109 & !_MC110;

% INIT_ %
 INIT_  = MCELL(  _MC013 $  GND );

% |CTSEQ2:381|-40- %
 _MC012 = DFF(  _EQ013 $  VCC, SCLK( CLK1 ),  RST1,  VCC );
```

```
  _EQ013 =  _X001 &  _X008 &  _X021 &  _X023 &  _X024 &  _X025 &  _X026 &
              _X027 &  _X028 &  _X029 &  _X030;
  _X024  = EXP(  BUF_SEL &  _MC001 &  _MC002 &  _MC003 &  _MC005 &  _MC006 &
              _MC009 & !_MC010 & !_MC012 &  _MC013 & !_MC014 & !_MC015 &
             !_MC078 &  _MC104 &  _MC111 &  _MC112 & !_MC120 );
  _X025  = EXP(  _MC001 &  _MC002 &  _MC003 &  _MC005 &  _MC008 & !_MC013 &
             !_MC014 & !_MC015 &  _MC111 & !_MC112 );
  _X026  = EXP( !BUF_SEL &  _MC001 &  _MC002 &  _MC003 &  _MC005 &  _MC006 &
              _MC009 & !_MC012 &  _MC013 & !_MC014 & !_MC015 & !_MC078 &
              _MC104 & !_MC108 &  _MC111 &  _MC112 & !_MC120 );
  _X027  = EXP(  BUF_SEL &  _MC001 &  _MC002 &  _MC003 &  _MC005 & !_MC006 &
             !_MC009 & !_MC010 & !_MC012 &  _MC013 & !_MC014 & !_MC015 &
             !_MC078 &  _MC104 &  _MC111 &  _MC112 & !_MC120 );
  _X028  = EXP( !_MC001 & !_MC002 &  _MC003 &  _MC005 &  _MC012 &  _MC013 &
             !_MC014 & !_MC015 & !_MC112 );
  _X029  = EXP(  _MC001 &  _MC002 &  _MC003 &  _MC005 &  _MC012 & !_MC013 &
             !_MC014 & !_MC015 &  _MC111 & !_MC112 );
  _X030  = EXP(  _MC001 &  _MC002 &  _MC003 &  _MC005 & !_MC012 &  _MC013 &
             !_MC014 & !_MC015 & !_MC111 & !_MC112 );

%  |CTSEQ2:381|-34-  %
 _MC013  = DFF(  _EQ014 $  VCC, SCLK( CLK1 ),  RST1,  VCC );
  _EQ014 = !_MC001 & !_MC002 & !_MC003 & !_MC005 & !_MC012 & !_MC013 &
             !_MC014 & !_MC015 & !_MC111 & !_MC112
         #  _MC001 &  _MC002 &  _MC003 &  _MC005 & !_MC013 & !_MC014 &
             !_MC015 &  _MC111 & !_MC112;

%  |CTSEQ2:381|-33-  %
 _MC014  = DFF(  _EQ015 $  GND, SCLK( CLK1 ),  RST1,  VCC );
  _EQ015 =  _MC001 & !_MC002 & !_MC003 &  _MC005 & !_MC012 &  _MC013 &
             !_MC014 & !_MC015 &  _MC074 & !_MC075 & !_MC095 & !_MC111 &
             !_MC112
         #  _MC001 &  _MC002 &  _MC003 &  _MC005 & !_MC008 &  _MC012 &
             !_MC013 & !_MC014 & !_MC015 &  _MC111 & !_MC112
         #  _MC001 & !_MC002 &  _MC003 &  _MC005 & !_MC012 &  _MC013 &
             !_MC014 & !_MC015 & !_MC111 & !_MC112;

%  |CTSEQ2:381|-32-  %
 _MC015  = DFF(  _EQ016 $  GND, SCLK( CLK1 ),  RST1,  VCC );
  _EQ016 = !_MC001 & !_MC002 & !_MC003 &  _MC005 & !_MC012 &  _MC013 &
              _MC014 & !_MC015 & !_MC111 & !_MC112;

%  |CTSEQ2:381|REFOFF  %
 _MC016  = MCELL(  _EQ017 $  VCC );
  _EQ017 = !_MC013 &  _MC014
         # !_MC001 &  _MC002;

VADR2    = TRI(  _MC017, !ATE);
 _MC017  = MCELL(  _EQ018 $  _EQ019 );
  _EQ018 =  _MC012 &  _MC111 &  _MC126
         # !_MC012 &  _MC046 &  _MC111
         # !_MC012 &  _MC094 & !_MC111;
  _EQ019 =  _MC012 &  _MC092 & !_MC111;

VADR3    = TRI(  _MC018, !ATE);
 _MC018  = MCELL(  _EQ020 $  _EQ021 );
  _EQ020 =  _MC012 &  _MC111 &  _MC125
         # !_MC012 &  _MC045 &  _MC111
         # !_MC012 &  _MC093 & !_MC111;
  _EQ021 =  _MC012 &  _MC091 & !_MC111;

%  |74273:90|:19  %
 _MC022  = DFF(  MB_8 $  GND,  LD_NOP,  VCC,  VCC );

%  |74273:89|:15  %
 _MC023  = DFF(  MB_4 $  GND,  LD_NOP,  VCC,  VCC );
```

```
% |74273:89|:14 %
 _MC024  = DFF( MB_5 $ GND, LD_NOP, VCC, VCC );

% |74273:89|:13 %
 _MC025  = DFF( MB_6 $ GND, LD_NOP, VCC, VCC );

% |74273:89|:12 %
 _MC026  = DFF( MB_7 $ GND, LD_NOP, VCC, VCC );

% |8COUNT:119|QG %
 _MC027  = DFF( _EQ022 $ _EQ023, _MC014, VCC, VCC );
  _EQ022 = INIT_ & _MC028 & _MC029 & _MC030 & _MC031 & _MC093 & _MC094 &
           !RCRY2 & _X031
         # _MC022 & RCRY2 & _X031
         # !INIT_ & _MC022;
  _X031  = EXP( !LINE & !RCRY0 );
  _EQ023 = INIT_ & _MC027 & !RCRY2;

% |8COUNT:119|QF %
 _MC028  = DFF( _EQ024 $ _EQ025, _MC014, VCC, VCC );
  _EQ024 = INIT_ & _MC029 & _MC030 & _MC031 & _MC093 & _MC094 & !RCRY2 &
            _X031
         # _MC026 & RCRY2 & _X031
         # !INIT_ & _MC026;
  _EQ025 = INIT_ & _MC028 & !RCRY2;

% |8COUNT:119|QE %
 _MC029  = DFF( _EQ026 $ _EQ027, _MC014, VCC, VCC );
  _EQ026 = INIT_ & _MC030 & _MC031 & _MC093 & _MC094 & !RCRY2 & _X031
         # _MC025 & RCRY2 & _X031
         # !INIT_ & _MC025;
  _EQ027 = INIT_ & _MC029 & !RCRY2;

% |8COUNT:119|QD %
 _MC030  = DFF( _EQ028 $ _EQ029, _MC014, VCC, VCC );
  _EQ028 = INIT_ & _MC031 & _MC093 & _MC094 & !RCRY2 & _X031
         # _MC024 & RCRY2 & _X031
         # !INIT_ & _MC024;
  _EQ029 = INIT_ & _MC030 & !RCRY2;

% |8COUNT:119|QC %
 _MC031  = DFF( _EQ030 $ _EQ031, _MC014, VCC, VCC );
  _EQ030 = INIT_ & _MC093 & _MC094 & !RCRY2 & _X031
         # _MC023 & RCRY2 & _X031
         # !INIT_ & _MC023;
  _EQ031 = INIT_ & _MC031 & !RCRY2;

% RCRY1 %
 RCRY1   = MCELL( _EQ032 $ GND );
  _EQ032 = LINE & _MC027 & _MC028 & _MC029 & _MC030 & _MC031 & _MC093 &
            _MC094
         # _MC027 & _MC028 & _MC029 & _MC030 & _MC031 & _MC093 &
            _MC094 & RCRY0
         # !INIT_ & _MC027 & _MC028 & _MC029 & _MC030 & _MC031 & _MC093 &
           _MC094;

VADR0    = TRI( _MC033, !ATE);
 _MC033  = MCELL( _EQ033 $ _EQ034 );
  _EQ033 = _MC012 & _MC111 & _MC128
         # !_MC012 & _MC079 & _MC111
         # !_MC012 & _MC084 & !_MC111;
         # _MC038 & RCRY1 & RCRY2
         # !INIT_ & _MC038;
  _EQ046 = INIT_ & _MC045 & !RCRY2;
```

```
% |8COUNT:122|QC %
 _MC046  = DFF( _EQ047 $ _EQ048, _MC014, VCC, VCC );
  _EQ047 = INIT_ & _MC047 & _MC079 & RCRY1 & !RCRY2
         # _MC036 & RCRY1 & RCRY2
         # !INIT_ & _MC036;
  _EQ048 = INIT_ & _MC046 & !RCRY2;

% |8COUNT:122|QB %
 _MC047  = DFF( _EQ049 $ _EQ050, _MC014, VCC, VCC );
  _EQ049 = INIT_ & _MC079 & RCRY1 & !RCRY2
         # _MC037 & RCRY1 & RCRY2
         # !INIT_ & _MC037;
  _EQ050 = INIT_ & _MC047 & !RCRY2;

% RCRY2 %
 RCRY2   = MCELL( _EQ051 $ GND );
  _EQ051 = _MC042 & _MC043 & _MC044 & _MC045 & _MC046 & _MC047 &
             _MC079 & RCRY1;

LOWER_SI = TRI( _MC051, !ATE);
 _MC051  = MCELL( _EQ052 $ GND );
  _EQ052 = _MC015 & !_MC064;

UPPER_SI = TRI( _MC052, !ATE);
 _MC052  = MCELL( _EQ053 $ GND );
  _EQ053 = _MC015 & _MC064;

VADR5    = TRI( _MC053, !ATE);
 _MC053  = MCELL( _EQ054 $ VCC );
  _EQ054 = _X032 & _X033 & _X034 & _X035 & _X036 & _X037;
  _X032  = EXP( !BUF_SEL & _MC012 & _MC111 & _MC123 );
  _X033  = EXP( BUF_SEL & _MC012 & _MC111 & _MC116 );
  _X034  = EXP( BUF_SEL & !_MC012 & _MC073 & _MC111 );
  _X035  = EXP( !BUF_SEL & !_MC012 & _MC043 & _MC111 );
  _X036  = EXP( _MC012 & _MC089 & !_MC111 );
  _X037  = EXP( !_MC012 & _MC030 & !_MC111 );

VADR7    = TRI( _MC054, !ATE);
 _MC054  = MCELL( _EQ055 $ VCC );
  _EQ055 = _X038 & _X039 & _X040 & _X041 & _X042 & _X043;
  _X038  = EXP( !BUF_SEL & _MC012 & _MC111 & _MC116 );
  _X039  = EXP( BUF_SEL & _MC012 & _MC111 & _MC114 );
  _X040  = EXP( BUF_SEL & !_MC012 & _MC069 & _MC111 );
  _X041  = EXP( !BUF_SEL & !_MC012 & _MC073 & _MC111 );
  _X042  = EXP( _MC012 & _MC087 & !_MC111 );
  _X043  = EXP( !_MC012 & _MC028 & !_MC111 );

% |7476:478|1Q %
 _MC064  = DFF( _MC064 $ VCC, !_MC015, _EQ056, VCC );
  _EQ056 = INIT_ & !_MC095;

% |74273:90|:18 %
 _MC065  = DFF( MB_9 $ GND, LD_NOP, VCC, VCC );

% |74273:89|:18 %
 _MC066  = DFF( MB_1 $ GND, LD_NOP, VCC, VCC );

% |74161:450|QB %
 _MC067  = DFF( _EQ057 $ _EQ058, _MC014, VCC, VCC );
  _EQ057 = INIT_ & _MC084 & !RCRY0 & _X044
         # _MC066 & _X045;
  _X044  = EXP( LINE & !RCRY2 );
  _X045  = EXP( INIT_ & !RCRY0 );
  _EQ058 = INIT_ & _MC067 & !RCRY0;

% |74161:40|QD %
 _MC068  = DFF( _EQ059 $ _MC068, _MC014, INIT_, VCC );
```

```
  _EQ059 =  LINE &  _MC069 &  _MC070 &  _MC073 &  RCRY0
          # !LINE &  _MC069 &  _MC070 &  _MC073 &  RCRY2;

% |74161:40|QC  %
 _MC069  = DFF(  _EQ060 $  _MC069,  _MC014,  INIT_,  VCC );
  _EQ060 =  LINE &  _MC070 &  _MC073 &  RCRY0
          # !LINE &  _MC070 &  _MC073 &  RCRY2;

% |74161:40|QB  %
 _MC070  = DFF(  _EQ061 $  _MC070,  _MC014,  INIT_,  VCC );
  _EQ061 =  LINE &  _MC073 &  RCRY0
          # !LINE &  _MC073 &  RCRY2;

VADR6    = TRI(  _MC071, !ATE);
 _MC071  = MCELL(  _EQ062 $  VCC );
  _EQ062 =  _X046 &  _X047 &  _X048 &  _X049 &  _X050 &  _X051;
  _X046  = EXP( !BUF_SEL &  _MC012 &  _MC111 &  _MC122 );
  _X047  = EXP(  BUF_SEL &  _MC012 &  _MC111 &  _MC115 );
  _X048  = EXP(  BUF_SEL & !_MC012 &  _MC070 &  _MC111 );
  _X049  = EXP( !BUF_SEL & !_MC012 &  _MC042 &  _MC111 );
  _X050  = EXP(  _MC012 &  _MC088 & !_MC111 );
  _X051  = EXP( !_MC012 &  _MC029 & !_MC111 );

VADR8    = TRI(  _MC072, !ATE);
 _MC072  = MCELL(  _EQ063 $  VCC );
  _EQ063 =  _X052 &  _X053 &  _X054 &  _X055 &  _X056 &  _X057;
  _X052  = EXP( !BUF_SEL &  _MC012 &  _MC111 &  _MC115 );
  _X053  = EXP(  BUF_SEL &  _MC012 &  _MC111 &  _MC113 );
  _X054  = EXP(  BUF_SEL & !_MC012 &  _MC068 &  _MC111 );
  _X055  = EXP( !BUF_SEL & !_MC012 &  _MC070 &  _MC111 );
  _X056  = EXP(  _MC012 & !_MC111 &  _MC121 );
  _X057  = EXP( !_MC012 &  _MC027 & !_MC111 );

% |74161:40|QA  %
 _MC073  = DFF(  _EQ064 $  _MC073,  _MC014,  INIT_,  VCC );
  _EQ064 =  LINE &  RCRY0
          # !LINE &  RCRY2;

% |7476:478|2Q  %
 _MC074  = DFF(  _MC074 $  VCC,  _MC014,  _EQ065,  VCC );
  _EQ065 =  INIT_ & !_MC112;

% |7474:406|2Q  %
 _MC075  = DFF(  RCRY1 $  GND,  _MC014, !_MC111,  VCC );

% |7474:406|1Q  %
 _MC076  = DFF(  GND $  GND,  GND,  _MC016,  REF_ON );

% |7474:395|1Q  %
 _MC077  = DFF(  VCC $  GND,  BUF_SO, !_MC014,  INIT_ );

% |7474:217|1Q  %
 _MC078  = DFF(  _EQ066 $  GND,  _MC014,  _EQ067,  VCC );
  _EQ066 =  LINE &  RCRY0
          # !LINE &  RCRY2;
  _EQ067 =  INIT_ & !_MC009;

% |8COUNT:122|QA  %
 _MC079  = DFF(  _EQ068 $  _EQ069,  _MC014,  VCC,  VCC );
  _EQ068 =  INIT_ &  RCRY1 & !RCRY2
          #  _MC065 &  RCRY1
          # !INIT_ &  _MC065;
  _EQ069 =  INIT_ &  _MC079 & !RCRY2;

% RCRY0  %
 RCRY0   = MCELL(  _EQ070 $  GND );
```

```
 _EQ070 =  _MC067 &  _MC084 &  RCRY2
        # !LINE &  _MC067 &  _MC084;

% |74273:89|:19  %
 _MC081  = DFF(  MB_0 $  GND,  LD_NOP,  VCC,  VCC );

% |74273:89|:17  %
 _MC082  = DFF(  MB_2 $  GND,  LD_NOP,  VCC,  VCC );

% |74273:89|:16  %
 _MC083  = DFF(  MB_3 $  GND,  LD_NOP,  VCC,  VCC );

% |74161:450|QA  %
 _MC084  = DFF(  _EQ071 $ !_MC084,  _MC014,  VCC,  VCC );
  _EQ071 =  INIT_ &  LINE & !RCRY0 & !RCRY2
        #  _MC081 &  _MC084 &  _X045
        # !_MC081 & !_MC084 &  _X045;

% |74161:22|QB  %
 _MC085  = DFF(  _EQ072 $  _MC066,  _EQ073,  VCC,  VCC );
  _EQ072 =  INIT_ & !_MC066 &  _MC085 & !_MC086
        #  INIT_ & !_MC066 & !_MC085 &  _MC086
        #  INIT_ &  _MC066 & !_MC085 & !_MC086;
  _EQ073 =  _X058 &  _X059 &  _X060 &  _X061;
  _X058  = EXP(  CT_STR &  INIT_ & !TEST );
  _X059  = EXP(  INIT_ &  TEST &  TST_STR );
  _X060  = EXP( !_MC014 &  TEST &  TST_STR );
  _X061  = EXP(  CT_STR & !_MC014 & !TEST );

% |74161:22|QA  %
 _MC086  = DFF(  _EQ074 $  _MC081,  _EQ075,  VCC,  VCC );
  _EQ074 =  INIT_ &  _MC081 & !_MC085 &  _MC086
        #  INIT_ & !_MC081 & !_MC086;
  _EQ075 =  _X058 &  _X059 &  _X060 &  _X061;

% |8COUNT:132|QF  %
 _MC087  = DFF(  _EQ076 $  _MC087,  _EQ077,  _EQ078,  _EQ079 );
  _EQ076 =  INIT_ &  _MC085 &  _MC086 &  _MC088 &  _MC089 &  _MC090 &  _MC091 &
              _MC092
        # !INIT_ &  _MC026 & !_MC087
        # !INIT_ & !_MC026 &  _MC087;
  _EQ077 =  _X058 &  _X059 &  _X060 &  _X061;
  _EQ078 =  _X062;
  _X062  = EXP(  _MC002 & !_MC005 & !_MC026 &  _MC117 &  _MC122 &  _MC123 &
              _MC124 &  _MC125 &  _MC126 &  _MC127 &  _MC128 );
  _EQ079 =  _X063;
  _X063  = EXP(  _MC002 & !_MC005 &  _MC026 &  _MC117 &  _MC122 &  _MC123 &
              _MC124 &  _MC125 &  _MC126 &  _MC127 &  _MC128 );

% |8COUNT:132|QE  %
 _MC088  = DFF(  _EQ080 $  _MC088,  _EQ081,  _EQ082,  _EQ083 );
  _EQ080 =  INIT_ &  _MC085 &  _MC086 &  _MC089 &  _MC090 &  _MC091 &  _MC092
        # !INIT_ &  _MC025 & !_MC088
        # !INIT_ & !_MC025 &  _MC088;
  _EQ081 =  _X058 &  _X059 &  _X060 &  _X061;
  _EQ082 =  _X064;
  _X064  = EXP(  _MC002 & !_MC005 & !_MC025 &  _MC117 &  _MC122 &  _MC123 &
              _MC124 &  _MC125 &  _MC126 &  _MC127 &  _MC128 );
  _EQ083 =  _X065;
  _X065  = EXP(  _MC002 & !_MC005 &  _MC025 &  _MC117 &  _MC122 &  _MC123 &
              _MC124 &  _MC125 &  _MC126 &  _MC127 &  _MC128 );

% |8COUNT:132|QD  %
 _MC089  = DFF(  _EQ084 $  _MC089,  _EQ085,  _EQ086,  _EQ087 );
  _EQ084 =  INIT_ &  _MC085 &  _MC086 &  _MC090 &  _MC091 &  _MC092
```

```
        # !INIT_ &  _MC024 & !_MC089
        # !INIT_ & !_MC024 &  _MC089;
  _EQ085 =  _X058 &  _X059 &  _X060 &  _X061;
  _EQ086 =  _X066;
  _X066  = EXP(  _MC002 & !_MC005 & !_MC024 &  _MC117 &  _MC122 &  _MC123 &
               _MC124 &  _MC125 &  _MC126 &  _MC127 &  _MC128 );
  _EQ087 =  _X067;
  _X067  = EXP(  _MC002 & !_MC005 &  _MC024 &  _MC117 &  _MC122 &  _MC123 &
               _MC124 &  _MC125 &  _MC126 &  _MC127 &  _MC128 );

% |8COUNT:132|QC  %
 _MC090  = DFF(  _EQ088 $  _MC090,  _EQ089,  _EQ090,  _EQ091 );
  _EQ088 =  INIT_ &  _MC085 &  _MC086 &  _MC091 &  _MC092
        # !INIT_ &  _MC023 & !_MC090
        # !INIT_ & !_MC023 &  _MC090;
  _EQ089 =  _X058 &  _X059 &  _X060 &  _X061;
  _EQ090 =  _X068;
  _X068  = EXP(  _MC002 & !_MC005 & !_MC023 &  _MC117 &  _MC122 &  _MC123 &
               _MC124 &  _MC125 &  _MC126 &  _MC127 &  _MC128 );
  _EQ091 =  _X069;
  _X069  = EXP(  _MC002 & !_MC005 &  _MC023 &  _MC117 &  _MC122 &  _MC123 &
               _MC124 &  _MC125 &  _MC126 &  _MC127 &  _MC128 );

% |8COUNT:132|QB  %
 _MC091  = DFF(  _EQ092 $  _MC091,  _EQ093,  _EQ094,  _EQ095 );
  _EQ092 =  INIT_ &  _MC085 &  _MC086 &  _MC092
        # !INIT_ &  _MC083 & !_MC091
        # !INIT_ & !_MC083 &  _MC091;
  _EQ093 =  _X058 &  _X059 &  _X060 &  _X061;
  _EQ094 =  _X070;
  _X070  = EXP(  _MC002 & !_MC005 & !_MC083 &  _MC117 &  _MC122 &  _MC123 &
               _MC124 &  _MC125 &  _MC126 &  _MC127 &  _MC128 );
  _EQ095 =  _X071;
  _X071  = EXP(  _MC002 & !_MC005 &  _MC083 &  _MC117 &  _MC122 &  _MC123 &
               _MC124 &  _MC125 &  _MC126 &  _MC127 &  _MC128 );

% |8COUNT:132|QA  %
 _MC092  = DFF(  _EQ096 $  _MC092,  _EQ097,  _EQ098,  _EQ099 );
  _EQ096 =  INIT_ &  _MC085 &  _MC086
        # !INIT_ &  _MC082 & !_MC092
        # !INIT_ & !_MC082 &  _MC092;
  _EQ097 =  _X058 &  _X059 &  _X060 &  _X061;
  _EQ098 =  _X072;
  _X072  = EXP(  _MC002 & !_MC005 & !_MC082 &  _MC117 &  _MC122 &  _MC123 &
               _MC124 &  _MC125 &  _MC126 &  _MC127 &  _MC128 );
  _EQ099 =  _X073;
  _X073  = EXP(  _MC002 & !_MC005 &  _MC082 &  _MC117 &  _MC122 &  _MC123 &
               _MC124 &  _MC125 &  _MC126 &  _MC127 &  _MC128 );

% |8COUNT:119|QB  %
 _MC093  = DFF(  _EQ100 $  _EQ101,  _MC014,  VCC,  VCC );
  _EQ100 =  INIT_ &  _MC094 & !RCRY2 &  _X031
        #  _MC083 &  RCRY2 &  _X031
        # !INIT_ &  _MC083;
  _EQ101 =  INIT_ &  _MC093 & !RCRY2;

% |8COUNT:119|QA  %
 _MC094  = DFF(  _EQ102 $  _EQ103,  _MC014,  VCC,  VCC );
  _EQ102 =  INIT_ & !LINE &  _MC094 & !RCRY0 & !RCRY2
        #  _MC082 &  RCRY2 &  _X031
        # !INIT_ &  _MC082;
  _EQ103 =  INIT_ & !_MC094 & !RCRY2 &  _X031;

% |PACK:405|~7~  %
 _MC095  = DFF(  _EQ104 $  _EQ105,  _MC014,  RST1,  VCC );
  _EQ104 =  INIT_ &  LINE &  _MC082 & !_MC095 & !_MC096 &  ODDADD & !UNPACK &
```

```
            _X074 &  _X075 &  _X076 &  _X077
        #  INIT_ &  _MC081 &  _MC082 & !_MC095 & !_MC096 &  ODDADD & !UNPACK &
            _X074 &  _X075 &  _X076 &  _X077
        # !LINE & !_MC081 & !_MC095 & !_MC096 & !ODDADD & !UNPACK &  _X074 &
            _X075 &  _X076 &  _X077;
  _X074  = EXP(  INIT_ & !_MC095 & !_MC096 & !RCRY2 & !UNPACK );
  _X075  = EXP( !_MC082 & !_MC095 & !_MC096 & !ODDADD & !UNPACK );
  _X076  = EXP( !_MC095 & !_MC096 & !ODDADD & !RCRY2 & !UNPACK );
  _X077  = EXP(  _MC095 &  _MC096 & !UNPACK );
  _EQ105 =  _X074 &  _X075 &  _X076 &  _X077;

% |PACK:405|-6- %
 _MC096  = DFF(  _EQ106 $  _EQ107,  _MC014,  RST1,  VCC );
  _EQ106 = !INIT_ & !_MC095 & !_MC096 &  ODDADD
        # !LINE & !_MC081 & !_MC095 & !_MC096
        # !_MC095 & !_MC096 &  _X078;
  _X078  = EXP(  _MC082 &  RCRY2 & !UNPACK );
  _EQ107 =  _X077;

SEN      = TRI(  _MC098, !ATE);
 _MC098  = DFF(  _MC098 $  _EQ108, SCLK( CLK1 ),  VCC,  INIT_ );
  _EQ108 = !_MC002 &  _MC098;

V_IRDY_  = TRI(  _MC100, !ATE);
 _MC100  = MCELL(  _EQ109 $  VCC );
  _EQ109 =  BUF_SEL &  CT_STR &  INIT_ &  _MC005 & !_MC010 & !_MC105 &
           !_MC106 & !_MC118 & !_MC119 & !TEST
        # !BUF_SEL &  CT_STR &  INIT_ &  _MC005 & !_MC105 & !_MC106 &
           !_MC108 & !_MC118 & !_MC119 & !TEST;

V_SCLK   = TRI(  _MC101, !ATE);
 _MC101  = MCELL(  _EQ110 $  _MC105 );
  _EQ110 = !INIT_ &  _MC014 & !_MC105
        # !_MC105 &  TEST & !TST_STR
        # !CT_STR & !_MC105 & !TEST;

% |7474:407|2Q %
 _MC104  = DFF(  _MC118 $  GND, SCLK( CLK1 ),  VCC,  VCC );

% |7474:375|1Q %
 _MC105  = DFF(  _MC106 $  GND, SCLK( CLK1 ),  VCC,  VCC );

% |7474:245|2Q %
 _MC106  = DFF(  _EQ111 $  _MC119, SCLK( CLK1 ),  VCC,  VCC );
  _EQ111 = !INIT_ &  _MC014 &  _MC119
        #  _MC119 &  TEST & !TST_STR
        # !CT_STR &  _MC119 & !TEST;

% |8COUNT:231|QD %
 _MC107  = DFF(  _EQ112 $  _MC107, SCLK( CLK1 ),  INIT_,  VCC );
  _EQ112 =  _MC006 & !_MC009 &  _MC108 &  _MC109 &  _MC110
        # !_MC006 &  _MC009 & !_MC108 & !_MC109 & !_MC110;

% |8COUNT:231|QC %
 _MC108  = DFF(  _EQ113 $  _MC108, SCLK( CLK1 ),  INIT_,  VCC );
  _EQ113 =  _MC006 & !_MC009 &  _MC109 &  _MC110
        # !_MC006 &  _MC009 & !_MC109 & !_MC110;

% |8COUNT:231|QB %
 _MC109  = DFF(  _EQ114 $  _MC109, SCLK( CLK1 ),  INIT_,  VCC );
  _EQ114 =  _MC006 & !_MC009 &  _MC110
        # !_MC006 &  _MC009 & !_MC110;

% |8COUNT:231|QA %
 _MC110  = DFF(  _EQ115 $  _MC110, SCLK( CLK1 ),  INIT_,  VCC );
  _EQ115 = !_MC006 &  _MC009
        #  _MC006 & !_MC009;
```

```
% |CTSEQ2:381|-39- %
 _MC111  = DFF( _EQ116 $ _EQ117, SCLK( CLK1 ), RST1, VCC );
  _EQ116 = _MC001 & _MC002 & _MC003 & _MC005 & !_MC010 & !_MC012 &
             _MC013 & !_MC014 & !_MC015 & _MC076 & !_MC104 & !_MC107 &
            !_MC108 & !_MC109 & !_MC110 & _MC111 & _MC112 & _X016 &
             _X019 & _X020 & _X023 & _X079 & _X080 & _X081 & _X082 &
             _X083 & _X084 & _X085 & _X086
         # BUF_SEL & _MC001 & _MC002 & _MC003 & _MC005 & !_MC007 &
             _MC010 & !_MC012 & _MC013 & !_MC014 & !_MC015 & _MC076 &
             _MC111 & _MC112 & _X016 & _X019 & _X020 & _X023 & _X079 &
             _X080 & _X081 & _X082 & _X083 & _X084 & _X085 & _X086
         # !BUF_SEL & _MC001 & _MC002 & _MC003 & _MC005 & !_MC007 &
            !_MC012 & _MC013 & !_MC014 & !_MC015 & _MC076 & _MC108 &
             _MC111 & _MC112 & _X016 & _X019 & _X020 & _X023 & _X079 &
             _X080 & _X081 & _X082 & _X083 & _X084 & _X085 & _X086;
  _X079  = EXP( _MC001 & _MC002 & _MC003 & _MC005 & !_MC006 & _MC009 &
            !_MC012 & _MC013 & !_MC014 & !_MC015 & _MC076 & _MC111 &
             _MC112 );
  _X080  = EXP( _MC001 & _MC002 & _MC003 & _MC005 & _MC006 & !_MC009 &
            !_MC012 & _MC013 & !_MC014 & !_MC015 & _MC076 & _MC111 &
             _MC112 );
  _X081  = EXP( _MC001 & _MC002 & _MC003 & _MC005 & !_MC007 & !_MC012 &
             _MC013 & !_MC014 & !_MC015 & _MC076 & !_MC104 & _MC111 &
             _MC112 );
  _X082  = EXP( _MC001 & _MC002 & _MC003 & _MC005 & !_MC012 & _MC013 &
            !_MC014 & !_MC015 & _MC076 & _MC111 & _MC112 & _MC120 );
  _X083  = EXP( _MC001 & _MC002 & _MC003 & _MC005 & !_MC012 & _MC013 &
            !_MC014 & !_MC015 & _MC076 & _MC078 & _MC111 & _MC112 );
  _X084  = EXP( !_MC001 & !_MC002 & _MC003 & !_MC005 & _MC012 & _MC013 &
            !_MC014 & !_MC015 & _MC076 & !_MC111 & !_MC112 );
  _X085  = EXP( !_MC001 & !_MC002 & _MC003 & _MC005 & _MC012 & _MC013 &
            !_MC014 & !_MC015 & _MC111 & !_MC112 );
  _X086  = EXP( _MC001 & !_MC002 & _MC003 & _MC005 & !_MC012 & _MC013 &
            !_MC014 & !_MC015 & !_MC112 );
  _EQ117 = _X016 & _X019 & _X020 & _X023 & _X079 & _X080 & _X081 &
             _X082 & _X083 & _X084 & _X085 & _X086;

% |CTSEQ2:381|-31- %
 _MC112  = DFF( _EQ118 $ VCC, SCLK( CLK1 ), RST1, VCC );
  _EQ118 = _X087 & _X088 & _X089 & _X090 & _X091 & _X092 & _X093 &
             _X094 & _X095 & _X096 & _X097 & _X098 & _X099;
  _X087  = EXP( _MC001 & _MC002 & _MC003 & _MC005 & !_MC010 & !_MC012 &
             _MC013 & !_MC014 & !_MC015 & !_MC076 & !_MC104 & !_MC107 &
            !_MC108 & !_MC109 & !_MC110 & _MC111 & _MC112 );
  _X088  = EXP( _MC001 & !_MC002 & _MC003 & _MC005 & _MC012 & _MC013 &
            !_MC014 & !_MC015 & _MC111 & !_MC112 );
  _X089  = EXP( _MC001 & _MC002 & _MC003 & _MC005 & !_MC012 & _MC013 &
            !_MC014 & !_MC015 & !_MC076 & _MC111 & _MC112 & _MC120 );
  _X090  = EXP( BUF_SEL & _MC001 & _MC002 & _MC003 & _MC005 & !_MC007 &
             _MC010 & !_MC012 & _MC013 & !_MC014 & !_MC015 & !_MC076 &
             _MC111 & _MC112 );
  _X091  = EXP( _MC001 & _MC002 & _MC003 & _MC005 & _MC012 & !_MC013 &
             _MC014 & !_MC015 & _MC111 & !_MC112 );
  _X092  = EXP( _MC001 & !_MC002 & !_MC003 & _MC005 & !_MC012 & _MC013 &
            !_MC014 & !_MC015 & !_MC074 & !_MC111 & !_MC112 );
  _X093  = EXP( !_MC001 & !_MC002 & _MC003 & !_MC005 & _MC012 & _MC013 &
            !_MC014 & !_MC015 & !_MC076 & !_MC111 & !_MC112 );
  _X094  = EXP( _MC001 & !_MC002 & !_MC003 & _MC005 & !_MC012 & _MC013 &
            !_MC014 & !_MC015 & _MC095 & !_MC111 & !_MC112 );
  _X095  = EXP( _MC001 & _MC002 & _MC003 & _MC005 & !_MC012 & _MC013 &
            !_MC014 & !_MC015 & !_MC076 & _MC078 & _MC111 & _MC112 );
  _X096  = EXP( !BUF_SEL & _MC001 & _MC002 & _MC003 & _MC005 & !_MC007 &
            !_MC012 & _MC013 & !_MC014 & !_MC015 & !_MC076 & _MC108 &
             _MC111 & _MC112 );
  _X097  = EXP( _MC001 & _MC002 & _MC003 & _MC005 & !_MC007 & !_MC012 &
             _MC013 & !_MC014 & !_MC015 & !_MC076 & !_MC104 & _MC111 &
             _MC112 );
```

```
 _X098  = EXP(  _MC001 &  _MC002 &  _MC003 &  _MC005 &  _MC006 & !_MC009 &
            !_MC012 &  _MC013 & !_MC014 & !_MC015 & !_MC076 &  _MC111 &
             _MC112 );
 _X099  = EXP(  _MC001 &  _MC002 &  _MC003 &  _MC005 & !_MC006 &  _MC009 &
            !_MC012 &  _MC013 & !_MC014 & !_MC015 & !_MC076 &  _MC111 &
             _MC112 );

% |74161:127|QD %
 _MC113  = DFF(  _MC113 $  _EQ119,  _EQ120,  INIT_,  VCC );
  _EQ119 =  _MC085 &  _MC086 &  _MC087 &  _MC088 &  _MC089 &  _MC090 &
              _MC091 &  _MC092 &  _MC114 &  _MC115 &  _MC116 &  _MC117 &
              _MC121 &  _MC122 &  _MC123 &  _MC124 &  _MC125 &  _MC126 &
              _MC127 &  _MC128;
  _EQ120 =  _X058 &  _X059 &  _X060 &  _X061;

% |74161:127|QC %
 _MC114  = DFF(  _MC114 $  _EQ121,  _EQ122,  INIT_,  VCC );
  _EQ121 =  _MC085 &  _MC086 &  _MC087 &  _MC088 &  _MC089 &  _MC090 &
              _MC091 &  _MC092 &  _MC115 &  _MC116 &  _MC117 &  _MC121 &
              _MC122 &  _MC123 &  _MC124 &  _MC125 &  _MC126 &  _MC127 &
              _MC128;
  _EQ122 =  _X058 &  _X059 &  _X060 &  _X061;

% |74161:127|QB %
 _MC115  = DFF(  _MC115 $  _EQ123,  _EQ124,  INIT_,  VCC );
  _EQ123 =  _MC085 &  _MC086 &  _MC087 &  _MC088 &  _MC089 &  _MC090 &
              _MC091 &  _MC092 &  _MC116 &  _MC117 &  _MC121 &  _MC122 &
              _MC123 &  _MC124 &  _MC125 &  _MC126 &  _MC127 &  _MC128;
  _EQ124 =  _X058 &  _X059 &  _X060 &  _X061;

% |74161:127|QA %
 _MC116  = DFF(  _MC116 $  _EQ125,  _EQ126,  INIT_,  VCC );
  _EQ125 =  _MC085 &  _MC086 &  _MC087 &  _MC088 &  _MC089 &  _MC090 &
              _MC091 &  _MC092 &  _MC117 &  _MC121 &  _MC122 &  _MC123 &
              _MC124 &  _MC125 &  _MC126 &  _MC127 &  _MC128;
  _EQ126 =  _X058 &  _X059 &  _X060 &  _X061;

% |7476:329|2Q %
 _MC117  = DFF(  _MC117 $  _EQ127,  _EQ128,  INIT_,  VCC );
  _EQ127 =  _MC085 &  _MC086 &  _MC087 &  _MC088 &  _MC089 &  _MC090 &
              _MC091 &  _MC092 & !_MC117 &  _MC121;
  _EQ128 =  _X058 &  _X059 &  _X060 &  _X061;

% |7474:407|1Q %
 _MC118  = DFF(  _EQ129 $  GND,  _EQ130,  _MC005,  INIT_ );
  _EQ129 =  _MC085 &  _MC086 &  _MC087 &  _MC088 &  _MC089 &  _MC090 &
              _MC091 &  _MC092 &  _MC121;
  _EQ130 =  _X058 &  _X059 &  _X060 &  _X061;

% |7474:245|1Q %
 _MC119  = DFF(  _EQ131 $  _MC086,  _EQ132,  _EQ133,  VCC );
  _EQ131 =  _MC086 &  _MC087 &  _MC088 &  _MC089 &  _MC090 &  _MC091 &
              _MC092 &  _MC121
        # !_MC081 &  _MC086
        # !_MC085 &  _MC086;
  _EQ132 =  _X058 &  _X059 &  _X060 &  _X061;
  _EQ133 =  INIT_ & !_MC106;

% |7474:217|2Q %
 _MC120  = DFF(  _EQ134 $  GND, !_MC118,  _EQ135,  VCC );
  _EQ134 =  _MC117 &  _MC122 &  _MC123 &  _MC124 &  _MC125 &  _MC126 &
              _MC127 &  _MC128;
  _EQ135 =  INIT_ & !_MC006;

% |8COUNT:132|QG %
 _MC121  = DFF(  _EQ136 $  _MC121,  _EQ137,  _EQ138,  _EQ139 );
```

```
_EQ136 =  INIT_ &  _MC085 &  _MC086 &  _MC087 &  _MC088 &  _MC089 &  _MC090 &
            _MC091 &  _MC092
       # !INIT_ &  _MC022 & !_MC121
       # !INIT_ & !_MC022 &  _MC121;
_EQ137 =  _X058 &  _X059 &  _X060 &  _X061;
_EQ138 =  _X100;
_X100  = EXP(  _MC002 & !_MC005 & !_MC022 &  _MC117 &  _MC122 &  _MC123 &
            _MC124 &  _MC125 &  _MC126 &  _MC127 &  _MC128 );
_EQ139 =  _X101;
_X101  = EXP(  _MC002 & !_MC005 &  _MC022 &  _MC117 &  _MC122 &  _MC123 &
            _MC124 &  _MC125 &  _MC126 &  _MC127 &  _MC128 );

% |8COUNT:131|QG %
_MC122  = DFF(  _EQ140 $  VCC,  _EQ141,  VCC,  VCC );
_EQ140 = !_MC041 &  _MC085 &  _MC086 &  _MC087 &  _MC088 &  _MC089 &
            _MC090 &  _MC091 &  _MC092 &  _MC117 &  _MC121 &  _MC122 &
            _MC123 &  _MC124 &  _MC125 &  _MC126 &  _MC127 &  _MC128
       #  INIT_ & !_MC122 &  _X102
       # !INIT_ & !_MC041;
_X102  = EXP(  _MC085 &  _MC086 &  _MC087 &  _MC088 &  _MC089 &  _MC090 &
            _MC091 &  _MC092 &  _MC117 &  _MC121 &  _MC123 &  _MC124 &
            _MC125 &  _MC126 &  _MC127 &  _MC128 );
_EQ141 =  _X058 &  _X059 &  _X060 &  _X061;

% |8COUNT:131|QF %
_MC123  = DFF(  _EQ142 $  _EQ143,  _EQ144,  VCC,  VCC );
_EQ142 =  _MC040 &  _MC122 &  _MC123
       #  INIT_ &  _MC123 &  _X103
       # !INIT_ &  _MC040;
_X103  = EXP(  _MC085 &  _MC086 &  _MC087 &  _MC088 &  _MC089 &  _MC090 &
            _MC091 &  _MC092 &  _MC117 &  _MC121 &  _MC124 &  _MC125 &
            _MC126 &  _MC127 &  _MC128 );
_EQ143 =  INIT_ &  _MC085 &  _MC086 &  _MC087 &  _MC088 &  _MC089 &  _MC090 &
            _MC091 &  _MC092 &  _MC117 &  _MC121 & !_MC123 &  _MC124 &
            _MC125 &  _MC126 &  _MC127 &  _MC128;
_EQ144 =  _X058 &  _X059 &  _X060 &  _X061;

% |8COUNT:131|QE %
_MC124  = DFF(  _EQ145 $  _EQ146,  _EQ147,  VCC,  VCC );
_EQ145 =  _MC039 &  _MC122 &  _MC123 &  _MC124
       #  INIT_ &  _MC124 &  _X104
       # !INIT_ &  _MC039;
_X104  = EXP(  _MC085 &  _MC086 &  _MC087 &  _MC088 &  _MC089 &  _MC090 &
            _MC091 &  _MC092 &  _MC117 &  _MC121 &  _MC125 &  _MC126 &
            _MC127 &  _MC128 );
_EQ146 =  INIT_ &  _MC085 &  _MC086 &  _MC087 &  _MC088 &  _MC089 &  _MC090 &
            _MC091 &  _MC092 &  _MC117 &  _MC121 & !_MC124 &  _MC125 &
            _MC126 &  _MC127 &  _MC128;
_EQ147 =  _X058 &  _X059 &  _X060 &  _X061;

% |8COUNT:131|QD %
_MC125  = DFF(  _EQ148 $  _EQ149,  _EQ150,  VCC,  VCC );
_EQ148 =  _MC038 &  _MC122 &  _MC123 &  _MC124 &  _MC125
       #  INIT_ &  _MC125 &  _X105
       # !INIT_ &  _MC038;
_X105  = EXP(  _MC085 &  _MC086 &  _MC087 &  _MC088 &  _MC089 &  _MC090 &
            _MC091 &  _MC092 &  _MC117 &  _MC121 &  _MC126 &  _MC127 &
            _MC128 );
_EQ149 =  INIT_ &  _MC085 &  _MC086 &  _MC087 &  _MC088 &  _MC089 &  _MC090 &
            _MC091 &  _MC092 &  _MC117 &  _MC121 & !_MC125 &  _MC126 &
            _MC127 &  _MC128;
_EQ150 =  _X058 &  _X059 &  _X060 &  _X061;

% |8COUNT:131|QC %
_MC126  = DFF(  _EQ151 $  _EQ152,  _EQ153,  VCC,  VCC );
_EQ151 =  _MC036 &  _MC122 &  _MC123 &  _MC124 &  _MC125 &  _MC126
```

```
        # INIT_ & _MC126 & _X106
        # !INIT_ & _MC036;
  _X106  = EXP( _MC085 & _MC086 & _MC087 & _MC088 & _MC089 & _MC090 &
            _MC091 & _MC092 & _MC117 & _MC121 & _MC127 & _MC128 );
  _EQ152 = INIT_ & _MC085 & _MC086 & _MC087 & _MC088 & _MC089 & _MC090 &
            _MC091 & _MC092 & _MC117 & _MC121 & !_MC126 & _MC127 &
            _MC128;
  _EQ153 = _X058 & _X059 & _X060 & _X061;

% |8COUNT:131|QB %
 _MC127  = DFF( _EQ154 $ _EQ155, _EQ156, VCC, VCC );
 _EQ154 = _MC037 & _MC122 & _MC123 & _MC124 & _MC125 & _MC126 &
            _MC127
        # INIT_ & _MC127 & _X107
        # !INIT_ & _MC037;
  _X107  = EXP( _MC085 & _MC086 & _MC087 & _MC088 & _MC089 & _MC090 &
            _MC091 & _MC092 & _MC117 & _MC121 & _MC128 );
  _EQ155 = INIT_ & _MC085 & _MC086 & _MC087 & _MC088 & _MC089 & _MC090 &
            _MC091 & _MC092 & _MC117 & _MC121 & !_MC127 & _MC128;
  _EQ156 = _X058 & _X059 & _X060 & _X061;

% |8COUNT:131|QA %
 _MC128  = DFF( _EQ157 $ _EQ158, _EQ159, VCC, VCC );
 _EQ157 = _MC065 & _MC122 & _MC123 & _MC124 & _MC125 & _MC126 &
            _MC127 & _MC128
        # INIT_ & _MC128 & _X108
        # !INIT_ & _MC065;
  _X108  = EXP( _MC085 & _MC086 & _MC087 & _MC088 & _MC089 & _MC090 &
            _MC091 & _MC092 & _MC117 & _MC121 );
  _EQ158 = INIT_ & _MC085 & _MC086 & _MC087 & _MC088 & _MC089 & _MC090 &
            _MC091 & _MC092 & _MC117 & _MC121 & !_MC128;
  _EQ159 = _X058 & _X059 & _X060 & _X061;


%
    Expanders that are Duplicated in Multiple LABs:
    _X016 occurs in LABs A-----G-
    _X019 occurs in LABs A-----G-
    _X020 occurs in LABs A-----G-
    _X023 occurs in LABs A-----G-
    _X031 occurs in LABs -B---F--
    _X045 occurs in LABs ----EF--
    _X058 occurs in LABs -----F-H
    _X059 occurs in LABs -----F-H
    _X060 occurs in LABs -----F-H
    _X061 occurs in LABs -----F-H
%
```

APPENDIX - H

```
MAX+PLUS Compiler Report File
 Version 2.50  05/31/90

***** Design compiled without errors

Title: SPATIAL MUX
Company: Scitex
Designer: ELI KATZIR
Rev: A
Date:  8:26a 11-13-1990
Turbo: CN
Security: OFF
```

```
                                            O   O
                                            R   R
                I   I   I   I   I   I       D   D   I       I   I   I   I   I   I
                N   N   N   N   N   N   V   E   E   N   G   N   N   N   N   N   N
                1   1   0   0   0   0   C   R   R   0   N   0   4   3   3   3   3
                1   0   8   7   6   5   C   1   2   0   D   1   0   8   7   6   5
              ------------------------------------------------------------------
            /   9   8   7   6   5   4   3   2   1  68  67  66  65  64  63  62  61  -
     IN12 | 10                                                                60 | IN34
     IN13 | 11                                                                59 | IN33
     IN46 | 12                                                                58 | IN32
     IN47 | 13                                                                57 | OUT04
     IN48 | 14                                                                56 | OUT03
      ATE | 15                                                                55 | OUT02
      GND | 16                                                                54 | VCC
 RESERVED | 17                                                                53 | OUT01
    OUT05 | 18                          EPM5128                               52 | OUT00
    OUT06 | 19                                                                51 | IN45
      VCC | 20                                                                50 | GND
    OUT07 | 21                                                                49 | IN44
    OUT08 | 22                                                                48 | IN43
 RESERVED | 23                                                                47 | IN42
     IN14 | 24                                                                46 | IN41
     IN15 | 25                                                                45 | IN31
     IN16 | 26                                                                44 | IN30
          |_  27  28  29  30  31  32  33  34  35  36  37  38  39  40  41  42  43  _|
              ------------------------------------------------------------------
                I   I   I   I   I   O   G   I   I   I   V   I   I   I   I   I   I
                N   N   N   N   N   R   N   N   N   N   C   N   N   N   N   N   N
                1   1   2   2   2   D   D   0   0   0   C   2   2   2   2   2   2
                7   8   0   1   2   E       4   3   2       3   4   5   6   7   8
                                    R
                                    0
```

D: \ELI\SPMUX.RPT

RESOURCE USAGE

| Logic Array Block | | Macrocells | I/O Pins | Expanders | External Interconnect |
|---|---|---|---|---|---|
| A: | MC1 - MC16 | 0/16( 0%) | 8/ 8(100%) | 0/32( 0%) | 0/24( 0%) |
| B: | MC17 - MC32 | 0/16( 0%) | 4/ 5( 80%) | 0/32( 0%) | 0/24( 0%) |
| C: | MC33 - MC48 | 4/16( 25%) | 4/ 5( 80%) | 8/32( 25%) | 13/24( 54%) |
| D: | MC49 - MC64 | 0/16( 0%) | 8/ 8(100%) | 0/32( 0%) | 0/24( 0%) |
| E: | MC65 - MC80 | 0/16( 0%) | 8/ 8(100%) | 0/32( 0%) | 0/24( 0%) |
| F: | MC81 - MC96 | 0/16( 0%) | 5/ 5(100%) | 0/32( 0%) | 0/24( 0%) |
| G: | MC97 - MC112 | 5/16( 31%) | 5/ 5(100%) | 22/32( 68%) | 19/24( 79%) |
| H: | MC113 - MC128 | 5/16( 31%) | 8/ 8(100%) | 0/32( 0%) | 15/24( 62%) |

```
Total dedicated input pins used:      8/  8 (100%)
Total I/O pins used:                 50/ 52 ( 96%)
Total macrocells used:               14/128 ( 10%)
Total expanders used:                30/256 ( 11%)

Total input pins required:           49
Total output pins required:           9
Total bidirectional pins required:    0
Total macrocells required:           14
Total expanders in database:         30

Synthesized macrocells:               5/128 (  3%)
```

D: \ELI\SPMUX.RPT

FILE HIERARCHY

```
|INMUX:2|
|74244:63|
|74244:62|
```

D: \ELI\SPMUX.RPT

INPUTS

| | | | | Expanders | | Fan-In | | |
|---|---|---|---|---|---|---|---|---|
| Pin | MCell | LAB | Primitive | Total | Shared | INP | FBK | Name |
| 15 | (20) | (B) | INPUT | 0 | 0 | 0 | 0 | ATE |
| 68 | - | - | INPUT | 0 | 0 | 0 | 0 | IN00 |
| 66 | - | - | INPUT | 0 | 0 | 0 | 0 | IN01 |
| 36 | - | - | INPUT | 0 | 0 | 0 | 0 | IN02 |
| 35 | - | - | INPUT | 0 | 0 | 0 | 0 | IN03 |
| 34 | - | - | INPUT | 0 | 0 | 0 | 0 | IN04 |
| 4 | (1) | (A) | INPUT | 0 | 0 | 0 | 0 | IN05 |
| 5 | (2) | (A) | INPUT | 0 | 0 | 0 | 0 | IN06 |
| 6 | (3) | (A) | INPUT | 0 | 0 | 0 | 0 | IN07 |
| 7 | (4) | (A) | INPUT | 0 | 0 | 0 | 0 | IN08 |
| 8 | (5) | (A) | INPUT | 0 | 0 | 0 | 0 | IN10 |
| 9 | (6) | (A) | INPUT | 0 | 0 | 0 | 0 | IN11 |
| 10 | (7) | (A) | INPUT | 0 | 0 | 0 | 0 | IN12 |
| 11 | (8) | (A) | INPUT | 0 | 0 | 0 | 0 | IN13 |
| 24 | (49) | (D) | INPUT | 0 | 0 | 0 | 0 | IN14 |
| 25 | (50) | (D) | INPUT | 0 | 0 | 0 | 0 | IN15 |
| 26 | (51) | (D) | INPUT | 0 | 0 | 0 | 0 | IN16 |
| 27 | (52) | (D) | INPUT | 0 | 0 | 0 | 0 | IN17 |
| 28 | (53) | (D) | INPUT | 0 | 0 | 0 | 0 | IN18 |
| 29 | (54) | (D) | INPUT | 0 | 0 | 0 | 0 | IN20 |
| 30 | (55) | (D) | INPUT | 0 | 0 | 0 | 0 | IN21 |
| 31 | (56) | (D) | INPUT | 0 | 0 | 0 | 0 | IN22 |
| 38 | (65) | (E) | INPUT | 0 | 0 | 0 | 0 | IN23 |
| 39 | (66) | (E) | INPUT | 0 | 0 | 0 | 0 | IN24 |
| 40 | (67) | (E) | INPUT | 0 | 0 | 0 | 0 | IN25 |
| 41 | (68) | (E) | INPUT | 0 | 0 | 0 | 0 | IN26 |
| 42 | (69) | (E) | INPUT | 0 | 0 | 0 | 0 | IN27 |
| 43 | (70) | (E) | INPUT | 0 | 0 | 0 | 0 | IN28 |
| 44 | (71) | (E) | INPUT | 0 | 0 | 0 | 0 | IN30 |
| 45 | (72) | (E) | INPUT | 0 | 0 | 0 | 0 | IN31 |
| 58 | (113) | (H) | INPUT | 0 | 0 | 0 | 0 | IN32 |
| 59 | (114) | (H) | INPUT | 0 | 0 | 0 | 0 | IN33 |
| 60 | (115) | (H) | INPUT | 0 | 0 | 0 | 0 | IN34 |
| 61 | (116) | (H) | INPUT | 0 | 0 | 0 | 0 | IN35 |
| 62 | (117) | (H) | INPUT | 0 | 0 | 0 | 0 | IN36 |
| 63 | (118) | (H) | INPUT | 0 | 0 | 0 | 0 | IN37 |
| 64 | (119) | (H) | INPUT | 0 | 0 | 0 | 0 | IN38 |
| 65 | (120) | (H) | INPUT | 0 | 0 | 0 | 0 | IN40 |
| 46 | (81) | (F) | INPUT | 0 | 0 | 0 | 0 | IN41 |
| 47 | (82) | (F) | INPUT | 0 | 0 | 0 | 0 | IN42 |
| 48 | (83) | (F) | INPUT | 0 | 0 | 0 | 0 | IN43 |
| 49 | (84) | (F) | INPUT | 0 | 0 | 0 | 0 | IN44 |
| 51 | (85) | (F) | INPUT | 0 | 0 | 0 | 0 | IN45 |
| 12 | (17) | (B) | INPUT | 0 | 0 | 0 | 0 | IN46 |
| 13 | (18) | (B) | INPUT | 0 | 0 | 0 | 0 | IN47 |
| 14 | (19) | (B) | INPUT | 0 | 0 | 0 | 0 | IN48 |
| 32 | - | - | INPUT | 0 | 0 | 0 | 0 | ORDER0 |
| 2 | - | - | INPUT | 0 | 0 | 0 | 0 | ORDER1 |
| 1 | - | - | INPUT | 0 | 0 | 0 | 0 | ORDER2 |

D: \ELI\SPMUX.RPT

OUTPUTS

| | | | | Expanders | | Fan-In | | |
|---|---|---|---|---|---|---|---|---|
| Pin | MCell | LAB | Primitive | Total | Shared | INP | FBK | Name |
| 52 | 97 | G | EQUATION | 5 | 0 | 9 | 0 | OUT00 |
| 53 | 98 | G | EQUATION | 5 | 0 | 9 | 0 | OUT01 |
| 55 | 99 | G | EQUATION | 5 | 0 | 9 | 0 | OUT02 |
| 56 | 100 | G | EQUATION | 5 | 0 | 9 | 0 | OUT03 |
| 57 | 101 | G | EQUATION | 2 | 0 | 6 | 1 | OUT04 |
| 18 | 33 | C | EQUATION | 2 | 0 | 6 | 1 | OUT05 |
| 19 | 34 | C | EQUATION | 2 | 0 | 6 | 1 | OUT06 |
| 21 | 35 | C | EQUATION | 2 | 0 | 6 | 1 | OUT07 |
| 22 | 36 | C | EQUATION | 2 | 0 | 6 | 1 | OUT08 |

D: \ELI\SPMUX.RPT

BURIED LOGIC

| | | | | Expanders | | Fan-In | | |
|---|---|---|---|---|---|---|---|---|
| Pin | MCell | LAB | Primitive | Total | Shared | INP | FBK | Name |
| - | 128 | H | SOFT s | 0 | 0 | 6 | 0 | \|INMUX: 2\|OUT04p |
| - | 127 | H | SOFT s | 0 | 0 | 6 | 0 | \|INMUX: 2\|OUT05p |
| - | 126 | H | SOFT s | 0 | 0 | 6 | 0 | \|INMUX: 2\|OUT06p |
| - | 125 | H | SOFT s | 0 | 0 | 6 | 0 | \|INMUX: 2\|OUT07p |

- 124 H

D: \ELI\SPMUX.RPT

MACROCELL INTERCONNECTION CROSS REFERENCE

Logic Array Block "C":

```
          M M M M
          C C C C
          3 3 3 3
          3 4 5 6
          | | | | | A B C D E F G H | Name
MC33  ->  - - - - | - - @ - - - - - | OUT05
MC34  ->  - - - - | - - @ - - - - - | OUT06
MC35  ->  - - - - | - - @ - - - - - | OUT07
MC36  ->  - - - - | - - @ - - - - - | OUT08

@15   ->  * * * * | - @ * - - - * - | ATE
@68   ->  - - - - | - - - - - - * - | IN00
@66   ->  - - - - | - - - - - - * - | IN01
@36   ->  - - - - | - - - - - - * - | IN02
@35   ->  - - - - | - - - - - - * - | IN03
@34   ->  - - - - | - - - - - - * - | IN04
@4    ->  * - - - | @ - * - - - - - | IN05
@5    ->  - * - - | @ - * - - - - - | IN06
@6    ->  - - * - | @ - * - - - - - | IN07
@7    ->  - - - * | @ - * - - - - - | IN08
@51   ->  * - - - | - - * - - @ - - | IN45
@12   ->  - * - - | - @ * - - - - - | IN46
@13   ->  - - * - | - @ * - - - - - | IN47
@14   ->  - - - * | - @ * - - - - - | IN48
@32   ->  * * * * | - - * - - - * * | ORDER0
@2    ->  * * * * | - - * - - - * * | ORDER1
@1    ->  * * * * | - - * - - - * * | ORDER2
MC127->   * - - - | - - * - - - - @ | |INMUX: 2|OUT05p
MC126->   - * - - | - - * - - - - @ | |INMUX: 2|OUT06p
MC125->   - - * - | - - * - - - - @ | |INMUX: 2|OUT07p
MC124->   - - - * | - - * - - - - @ | |INMUX: 2|OUT08p
```

D: \ELI\SPMUX.RPT

```
** MACROCELL INTERCONNECTION CROSS REFERENCE **

Logic Array Block "G":

        M M M M M
        C C C C C
        9 9 9 1 1
        7 8 9 0 0
        | | | 0 1 | A B C D E F G H | Name
MC97 -> - - - - - | - - - - - - @ - | OUT00
MC98 -> - - - - - | - - - - - - @ - | OUT01
MC99 -> - - - - - | - - - - - - @ - | OUT02
MC100-> - - - - - | - - - - - - @ - | OUT03
MC101-> - - - - - | - - - - - - @ - | OUT04

@15  -> * * * * * | - @ * - - - * - | ATE
@68  -> * - - - - | - - - - - - * - | IN00
@66  -> - * - - - | - - - - - - * - | IN01
@36  -> - - * - - | - - - - - - * - | IN02
@35  -> - - - * - | - - - - - - * - | IN03
@34  -> - - - - * | - - - - - - * - | IN04
@8   -> * - - - - | @ - - - - - * - | IN10
@9   -> - * - - - | @ - - - - - * - | IN11
@10  -> - - * - - | @ - - - - - * - | IN12
@11  -> - - - * - | @ - - - - - * - | IN13
@29  -> * - - - - | - - - @ - - * - | IN20
@30  -> - * - - - | - - - @ - - * - | IN21
@31  -> - - * - - | - - - @ - - * - | IN22
@38  -> - - - * - | - - - - @ - * - | IN23
@44  -> * - - - - | - - - - @ - * - | IN30
@45  -> - * - - - | - - - - @ - * - | IN31
@58  -> - - * - - | - - - - - - * @ | IN32
@59  -> - - - * - | - - - - - - * @ | IN33
@65  -> * - - - - | - - - - - - * @ | IN40
@46  -> - * - - - | - - - - - @ * - | IN41
@47  -> - - * - - | - - - - - @ * - | IN42
@48  -> - - - * - | - - - - - @ * - | IN43
@49  -> - - - - * | - - - - - @ * - | IN44
@32  -> * * * * * | - - * - - - * * | ORDER0
@2   -> * * * * * | - - * - - - * * | ORDER1
@1   -> * * * * * | - - * - - - * * | ORDER2
MC128-> - - - - * | - - - - - - * @ | |INMUX: 2|OUT04p


Logic Array Block "H":

        M M M M M
        C C C C C
        1 1 1 1 1
        2 2 2 2 2
        8 7 6 5 4 | A B C D E F G H | Name
MC128-> - - - - - | - - - - - - * @ | |INMUX: 2|OUT04p
MC127-> - - - - - | - - * - - - - @ | |INMUX: 2|OUT05p
MC126-> - - - - - | - - * - - - - @ | |INMUX: 2|OUT06p
MC125-> - - - - - | - - * - - - - @ | |INMUX: 2|OUT07p
MC124-> - -   - - | - - * - - - - @ | |INMUX: 2|OUT08p

@68  -> - - - - - | - - - - - - * - | IN00
@66  -> - - - - - | - - - - - - * - | IN01
@36  -> - - - - - | - - - - - - * - | IN02
@35  -> - - - - - | - - - - - - * - | IN03
@34  -> - - - - - | - - - - - - * - | IN04
@24  -> * - - - - | - - - @ - - - * | IN14
```

D: \ELI\SPMUX.RPT

MACROCELL INTERCONNECTION CROSS REFERENCE

```
@25    -> - * - - -  | - - - @ - - - *  | IN15
@26    -> - - * - -  | - - - @ - - - *  | IN16
@27    -> - - - * -  | - - - @ - - - *  | IN17
@28    -> - - - - *  | - - - @ - - - *  | IN18
@39    -> * - - - -  | - - - - @ - - *  | IN24
@40    -> - * - - -  | - - - - @ - - *  | IN25
@41    -> - - * - -  | - - - - @ - - *  | IN26
@42    -> - - - * -  | - - - - @ - - *  | IN27
@43    -> - - - - *  | - - - - @ - - *  | IN28
@60    -> * - - - -  | - - - - - - - @  | IN34
@61    -> - * - - -  | - - - - - - - @  | IN35
@62    -> - - * - -  | - - - - - - - @  | IN36
@63    -> - - - * -  | - - - - - - - @  | IN37
@64    -> - - - - *  | - - - - - - - @  | IN38
@32    -> * * * * *  | - - * - - - * *  | ORDER0
@2     -> * * * * *  | - - * - - - * *  | ORDER1
@1     -> * * * * *  | - - * - - - * *  | ORDER2
```

D: \ELI\SPMUX.RPT

EQUATIONS

```
IN30     : INPUT;
ORDER0   : INPUT;
ORDER1   : INPUT;
ORDER2   : INPUT;
IN10     : INPUT;
IN20     : INPUT;
IN40     : INPUT;
IN00     : INPUT;
ATE      : INPUT;
IN31     : INPUT;
IN11     : INPUT;
IN21     : INPUT;
IN41     : INPUT;
IN01     : INPUT;
IN32     : INPUT;
IN12     : INPUT;
IN22     : INPUT;
IN42     : INPUT;
IN02     : INPUT;
IN33     : INPUT;
IN13     : INPUT;
IN23     : INPUT;
IN43     : INPUT;
IN03     : INPUT;
IN38     : INPUT;
IN18     : INPUT;
IN28     : INPUT;
IN48     : INPUT;
IN08     : INPUT;
IN34     : INPUT;
IN14     : INPUT;
IN24     : INPUT;
IN44     : INPUT;
IN04     : INPUT;
IN35     : INPUT;
IN15     : INPUT;
IN25     : INPUT;
IN45     : INPUT;
IN05     : INPUT;
```

```
IN36     : INPUT;
IN16     : INPUT;
IN26     : INPUT;
IN46     : INPUT;
IN06     : INPUT;
IN37     : INPUT;
IN17     : INPUT;
IN27     : INPUT;
IN47     : INPUT;
IN07     : INPUT;

OUT05    = TRI( _MC033, !ATE);
 _MC033  = MCELL( _EQ001 $ VCC );
  _EQ001 =  _MC127 & _X001 & _X002;
  _X001  = EXP( IN45 & !ORDER0 & !ORDER1 & ORDER2 );
  _X002  = EXP( IN05 & !ORDER0 & !ORDER1 & !ORDER2 );

OUT06    = TRI( _MC034, !ATE);
 _MC034  = MCELL( _EQ002 $ VCC );
  _EQ002 =  _MC126 & _X003 & _X004;
  _X003  = EXP( IN46 & !ORDER0 & !ORDER1 & ORDER2 );
  _X004  = EXP( IN06 & !ORDER0 & !ORDER1 & !ORDER2 );

OUT07    = TRI( _MC035, !ATE);
 _MC035  = MCELL( _EQ003 $ VCC );
  _EQ003 =  _MC125 & _X005 & _X006;
  _X005  = EXP( IN47 & !ORDER0 & !ORDER1 & ORDER2 );
  _X006  = EXP( IN07 & !ORDER0 & !ORDER1 & !ORDER2 );

OUT08    = TRI( _MC036, !ATE);
 _MC036  = MCELL( _EQ004 $ VCC );
  _EQ004 =  _MC124 & _X007 & _X008;
  _X007  = EXP( IN48 & !ORDER0 & !ORDER1 & ORDER2 );
  _X008  = EXP( IN08 & !ORDER0 & !ORDER1 & !ORDER2 );

OUT00    = TRI( _MC097, !ATE);
 _MC097  = MCELL( _EQ005 $ VCC );
  _EQ005 =  _X009 & _X010 & _X011 & _X012 & _X013;
  _X009  = EXP( IN10 & ORDER0 & !ORDER1 & !ORDER2 );
  _X010  = EXP( IN30 & ORDER0 & ORDER1 & !ORDER2 );
  _X011  = EXP( IN20 & !ORDER0 & ORDER1 & !ORDER2 );
  _X012  = EXP( IN40 & !ORDER0 & !ORDER1 & ORDER2 );
  _X013  = EXP( IN00 & !ORDER0 & !ORDER1 & !ORDER2 );

OUT01    = TRI( _MC098, !ATE);
 _MC098  = MCELL( _EQ006 $ VCC );
  _EQ006 =  _X014 & _X015 & _X016 & _X017 & _X018;
  _X014  = EXP( IN11 & ORDER0 & !ORDER1 & !ORDER2 );
  _X015  = EXP( IN31 & ORDER0 & ORDER1 & !ORDER2 );
  _X016  = EXP( IN21 & !ORDER0 & ORDER1 & !ORDER2 );
  _X017  = EXP( IN41 & !ORDER0 & !ORDER1 & ORDER2 );
  _X018  = EXP( IN01 & !ORDER0 & !ORDER1 & !ORDER2 );

OUT02    = TRI( _MC099, !ATE);
 _MC099  = MCELL( _EQ007 $ VCC );
  _EQ007 =  _X019 & _X020 & _X021 & _X022 & _X023;
  _X019  = EXP( IN12 & ORDER0 & !ORDER1 & !ORDER2 );
  _X020  = EXP( IN32 & ORDER0 & ORDER1 & !ORDER2 );
  _X021  = EXP( IN22 & !ORDER0 & ORDER1 & !ORDER2 );
  _X022  = EXP( IN42 & !ORDER0 & !ORDER1 & ORDER2 );
  _X023  = EXP( IN02 & !ORDER0 & !ORDER1 & !ORDER2 );

OUT03    = TRI( _MC100, !ATE);
 _MC100  = MCELL( _EQ008 $ VCC );
```

```
  _EQ008 =  _X024 &  _X025 &  _X026 &  _X027 &  _X028;
  _X024  = EXP(  IN13 &  ORDER0 & !ORDER1 & !ORDER2 );
  _X025  = EXP(  IN33 &  ORDER0 &  ORDER1 & !ORDER2 );
  _X026  = EXP(  IN23 & !ORDER0 &  ORDER1 & !ORDER2 );
  _X027  = EXP(  IN43 & !ORDER0 & !ORDER1 &  ORDER2 );
  _X028  = EXP(  IN03 & !ORDER0 & !ORDER1 & !ORDER2 );

OUT04    = TRI(  _MC101, !ATE);
 _MC101  = MCELL(  _EQ009 $  VCC );
  _EQ009 =  _MC128 &  _X029 &  _X030;
  _X029  = EXP(  IN44 & !ORDER0 & !ORDER1 &  ORDER2 );
  _X030  = EXP(  IN04 & !ORDER0 & !ORDER1 & !ORDER2 );

% synthesized macrocell %
% |INMUX:2|OUT08p %
 _MC124  = MCELL(  _EQ010 $  VCC );
  _EQ010 =  IN38 &  ORDER0 &  ORDER1 & !ORDER2
         #  IN18 &  ORDER0 & !ORDER1 & !ORDER2
         #  IN28 & !ORDER0 &  ORDER1 & !ORDER2;

% synthesized macrocell %
% |INMUX:2|OUT07p %
 _MC125  = MCELL(  _EQ011 $  VCC );
  _EQ011 =  IN37 &  ORDER0 &  ORDER1 & !ORDER2
         #  IN17 &  ORDER0 & !ORDER1 & !ORDER2
         #  IN27 & !ORDER0 &  ORDER1 & !ORDER2;

% synthesized macrocell %
% |INMUX:2|OUT06p %
 _MC126  = MCELL(  _EQ012 $  VCC );
  _EQ012 =  IN36 &  ORDER0 &  ORDER1 & !ORDER2
         #  IN16 &  ORDER0 & !ORDER1 & !ORDER2
         #  IN26 & !ORDER0 &  ORDER1 & !ORDER2;

% synthesized macrocell %
% |INMUX:2|OUT05p %
 _MC127  = MCELL(  _EQ013 $  VCC );
  _EQ013 =  IN35 &  ORDER0 &  ORDER1 & !ORDER2
         #  IN15 &  ORDER0 & !ORDER1 & !ORDER2
         #  IN25 & !ORDER0 &  ORDER1 & !ORDER2;

% synthesized macrocell %
% |INMUX:2|OUT04p %
 _MC128  = MCELL(  _EQ014 $  VCC );
  _EQ014 =  IN34 &  ORDER0 &  ORDER1 & !ORDER2
         #  IN14 &  ORDER0 & !ORDER1 & !ORDER2
         #  IN24 & !ORDER0 &  ORDER1 & !ORDER2;


%
    Expanders that are Duplicated in Multiple LABs:
    (none)
%
```

APPENDIX - I

```
MAX+PLUS Compiler Report File
 Version 2.6 09/10/90

***** Design compiled without errors
```

Title: SP_BUFFER
Company: Scitex
Designer: ELI KATZIR
Rev: A
Date: 8:43p 11-20-1990
Turbo: ON
Security: OFF

EPM5192

| Pin | Signal | Pin | Signal |
|---|---|---|---|
| 11 | DSP_5 | 33 | EOP |
| 10 | DSP_4 | 34 | RAS0 |
| 9 | DSP_3 | 35 | RAS1 |
| 8 | DSP_2 | 36 | RAS2 |
| 7 | DSP_1 | 37 | RAS3 |
| 6 | DSP_0 | 38 | RAS4 |
| 5 | DSP_RDY | 39 | GND |
| 4 | BUF_SI | 40 | GND |
| 3 | VCC | 41 | MB_6 |
| 2 | RST1 | 42 | MB_5 |
| 1 | CLK1 | 43 | MB_4 |
| 84 | ATE | 44 | MB_1 |
| 83 | LD_PAR1 | 45 | VCC |
| 82 | GND | 46 | DSP_STR |
| 81 | GND | 47 | LD_PAR2 |
| 80 | V_SCLK | 48 | LOAD1 |
| 79 | V_ORDY_ | 49 | LWADR3 |
| 78 | V_HFULL | 50 | LWADR4 |
| 77 | V_FULL | 51 | MB_0 |
| 76 | TRG | 52 | VADR3 |
| 75 | MB_7 | 53 | VADR4 |
| 12 | TST_INC | 74 | MB_3 |
| 13 | TST_STR | 73 | MB_2 |
| 14 | RESERVED | 72 | SP_STR |
| 15 | RESERVED | 71 | SP_REQ |
| 16 | LWADR1 | 70 | LW_FLG |
| 17 | LWADR6 | 69 | IF_ACK |
| 18 | GND | 68 | SP_INC |
| 19 | GND | 67 | ORDER2 |
| 20 | VADR1 | 66 | VCC |
| 21 | VADR6 | 65 | ORDER1 |
| 22 | LOWER_ | 64 | ORDER0 |
| 23 | LWADR5 | 63 | WEN |
| 24 | VCC | 62 | V_EMPTY |
| 25 | UPPER_ | 61 | GND |
| 26 | VADR5 | 60 | GND |
| 27 | LWADR0 | 59 | REF_ON |
| 28 | LWADR2 | 58 | CAS_ |
| 29 | VADR0 | 57 | VADR8 |
| 30 | VADR2 | 56 | VADR7 |
| 31 | DSP_6 | 55 | LWADR8 |
| 32 | DSP_7 | 54 | LWADR7 |

D:\ELI\SPBUF.RPT

RESOURCE USAGE

| Logic Array Block | Macrocells | I/O Pins | Expanders | External Interconnect |
|---|---|---|---|---|
| A: MC1 - MC16 | 15/16( 93%) | 8/ 8(100%) | 32/32(100%) | 24/24(100%) |
| B: MC17 - MC32 | 16/16(100%) | 2/ 4( 50%) | 14/32( 43%) | 17/24( 70%) |
| C: MC33 - MC48 | 13/16( 81%) | 4/ 4(100%) | 17/32( 53%) | 24/24(100%) |
| D: MC49 - MC64 | 16/16(100%) | 4/ 4(100%) | 17/32( 53%) | 20/24( 83%) |
| E: MC65 - MC80 | 16/16(100%) | 4/ 4(100%) | 0/32( 0%) | 22/24( 91%) |
| F: MC81 - MC96 | 16/16(100%) | 8/ 8(100%) | 3/32( 9%) | 15/24( 62%) |
| G: MC97 - MC112 | 12/16( 75%) | 8/ 8(100%) | 0/32( 0%) | 19/24( 79%) |

| | | | | | |
|---|---|---|---|---|---|
| H: | MC113 - MC128 | 16/16(100%) | 4/ 4(100%) | 31/32( 96%) | 23/24( 95%) |
| I: | MC129 - MC144 | 14/16( 87%) | 4/ 4(100%) | 27/32( 84%) | 17/24( 70%) |
| J: | MC145 - MC160 | 16/16(100%) | 4/ 4(100%) | 24/32( 75%) | 24/24(100%) |
| K: | MC161 - MC176 | 16/16(100%) | 4/ 4(100%) | 17/32( 53%) | 16/24( 66%) |
| L: | MC177 - MC192 | 14/16( 87%) | 8/ 8(100%) | 29/32( 90%) | 23/24( 95%) |

| | |
|---|---|
| Total dedicated input pins used: | 8/ 8 (100%) |
| Total I/O pins used: | 62/ 64 ( 96%) |
| Total macrocells used: | 180/192 ( 93%) |
| Total expanders used: | 211/384 ( 54%) |

| | |
|---|---|
| Total input pins required: | 31 |
| Total output pins required: | 39 |
| Total bidirectional pins required: | 0 |
| Total macrocells required: | 180 |
| Total expanders in database: | 201 |

Synthesized macrocells: 0/192 ( 0%)

D: \ELI\SPBUF.RPT

FILE HIERARCHY

|74157: 841|
|74244: 860|
|74244: 679|
|74244: 678|
|7474: 764|
|7474: 756|
|7474: 245|
|7474: 368|
|7474: 217|
|7474: 233|
|7474: 398|
|7474: 440|
|7474: 439|
|7474: 509|
|7474: 848|
SPSEQ2: 770|
|74253: 762|
|74253: 737|
|74253: 736|
|74253: 735|
|74253: 734|
|74253: 733|
|74253: 677|
|74253: 676|
|74253: 675|
|74253: 674|
|74253: 672|
8COUNT: 747|
8COUNT: 706|
8COUNT: 705|
8COUNT: 131|
8COUNT: 132|
8COUNT: 119|
8COUNT: 122|
8COUNT: 231|
|74161: 709|
|74161: 473|
|74161: 462|
|74161: 127|
|74161: 46|

|74161: 40|
|74240: 680|
|74164: 475|
|74138: 543|
|7483: 587|
|4COUNT: 662|
|74273: 759|
|74273: 544|
|74273: 693|
|74273: 692|
|PACK: 414|
|SPSEQ1: 769|
|7476: 513|
|7476: 636|
|74157: 718|
|74157: 444|
|74157: 442|
|74157: 450|

D: \ELI\SPBUF.RPT

INPUTS

| | | | | Expanders | | Fan-In | | |
|---|---|---|---|---|---|---|---|---|
| Pin | MCell | LAB | Primitive | Total | Shared | INP | FBK | Name |
| 84 | - | - | INPUT | 0 | 0 | 0 | 0 | ATE |
| 4 | (1) | (A) | INPUT | 0 | 0 | 0 | 0 | BUF_SI |
| 1 | - | - | INPUT | 0 | 0 | 0 | 0 | CLK1 |
| 5 | (2) | (A) | INPUT | 0 | 0 | 0 | 0 | DSP_RDY |
| 6 | (3) | (A) | INPUT | 0 | 0 | 0 | 0 | DSP_0 |
| 7 | (4) | (A) | INPUT | 0 | 0 | 0 | 0 | DSP_1 |
| 8 | (5) | (A) | INPUT | 0 | 0 | 0 | 0 | DSP_2 |
| 9 | (6) | (A) | INPUT | 0 | 0 | 0 | 0 | DSP_3 |
| 10 | (7) | (A) | INPUT | 0 | 0 | 0 | 0 | DSP_4 |
| 11 | (8) | (A) | INPUT | 0 | 0 | 0 | 0 | DSP_5 |
| 31 | (81) | (F) | INPUT | 0 | 0 | 0 | 0 | DSP_6 |
| 32 | (82) | (F) | INPUT | 0 | 0 | 0 | 0 | DSP_7 |
| 33 | (83) | (F) | INPUT | 0 | 0 | 0 | 0 | EOP |
| 83 | - | - | INPUT | 0 | 0 | 0 | 0 | LD_PAR1 |
| 47 | (98) | (G) | INPUT | 0 | 0 | 0 | 0 | LD_PAR2 |
| 48 | (99) | (G) | INPUT | 0 | 0 | 0 | 0 | LOAD1 |
| 51 | (102) | (G) | INPUT | 0 | 0 | 0 | 0 | MB_0 |
| 44 | - | - | INPUT | 0 | 0 | 0 | 0 | MB_1 |
| 73 | (177) | (L) | INPUT | 0 | 0 | 0 | 0 | MB_2 |
| 74 | (178) | (L) | INPUT | 0 | 0 | 0 | 0 | MB_3 |
| 43 | - | - | INPUT | 0 | 0 | 0 | 0 | MB_4 |
| 42 | - | - | INPUT | 0 | 0 | 0 | 0 | MB_5 |
| 41 | - | - | INPUT | 0 | 0 | 0 | 0 | MB_6 |
| 75 | (179) | (L) | INPUT | 0 | 0 | 0 | 0 | MB_7 |
| 59 | (130) | (I) | INPUT | 0 | 0 | 0 | 0 | REF_ON |
| 2 | - | - | INPUT | 0 | 0 | 0 | 0 | RST1 |
| 68 | (148) | (J) | INPUT | 0 | 0 | 0 | 0 | SP_INC |
| 71 | (163) | (K) | INPUT | 0 | 0 | 0 | 0 | SP_REQ |
| 72 | (164) | (K) | INPUT | 0 | 0 | 0 | 0 | SP_STR |
| 12 | (17) | (B) | INPUT | 0 | 0 | 0 | 0 | TST_INC |
| 13 | (18) | (B) | INPUT | 0 | 0 | 0 | 0 | TST_STR |

D: \ELI\SPBUF.RPT

OUTPUTS

| | | | | Expanders | | Fan-In | | |
|---|---|---|---|---|---|---|---|---|
| Pin | MCell | LAB | Primitive | Total | Shared | INP | FBK | Name |
| 58 | 129 | I | DFF+ | 4 | 4 | 4 | 11 | CAS |
| 46 | 97 | G | DFF+ | 0 | 0 | 3 | 6 | DSP_STR |

| | | | | | | | | |
|---|---|---|---|---|---|---|---|---|
| 69 | 161 | K | DFF | 0 | 0 | 2 | 1 | IF_ACK |
| 22 | 49 | D | DFF | 0 | 0 | 1 | 4 | LOWER_ |
| 27 | 65 | E | OR4 | 0 | 0 | 1 | 6 | LWADR0 |
| 16 | 33 | C | OR4 | 0 | 0 | 1 | 6 | LWADR1 |
| 28 | 66 | E | OR4 | 0 | 0 | 1 | 6 | LWADR2 |
| 49 | 100 | G | OR4 | 0 | 0 | 1 | 6 | LWADR3 |
| 50 | 101 | G | OR4 | 0 | 0 | 1 | 6 | LWADR4 |
| 23 | 50 | D | OR4 | 7 | 5 | 2 | 9 | LWADR5 |
| 17 | 34 | C | OR4 | 8 | 6 | 2 | 10 | LWADR6 |
| 54 | 113 | H | OR4 | 10 | 9 | 2 | 10 | LWADR7 |
| 55 | 114 | H | OR4 | 12 | 11 | 2 | 11 | LWADR8 |
| 70 | 162 | K | OR4 | 0 | 0 | 1 | 6 | LW_FLG |
| 64 | 145 | J | DFF | 0 | 0 | 1 | 3 | ORDER0 |
| 65 | 146 | J | DFF | 0 | 0 | 1 | 4 | ORDER1 |
| 67 | 147 | J | DFF | 0 | 0 | 1 | 4 | ORDER2 |
| 34 | 84 | F | OR2 | 1 | 1 | 1 | 8 | RAS0 |
| 35 | 85 | F | OR2 | 1 | 1 | 1 | 8 | RAS1 |
| 36 | 86 | F | OR2 | 1 | 1 | 1 | 8 | RAS2 |
| 37 | 87 | F | OR2 | 1 | 1 | 1 | 8 | RAS3 |
| 38 | 88 | F | OR2 | 1 | 1 | 1 | 8 | RAS4 |
| 76 | 180 | L | DFF+ | 14 | 1 | 4 | 19 | TRG |
| 25 | 51 | D | DFF | 0 | 0 | 1 | 3 | UPPER_ |
| 29 | 67 | E | OR4 | 0 | 0 | 1 | 6 | VADR0 |
| 20 | 35 | C | OR4 | 0 | 0 | 1 | 6 | VADR1 |
| 30 | 68 | E | OR4 | 0 | 0 | 1 | 6 | VADR2 |
| 52 | 103 | G | OR4 | 0 | 0 | 1 | 6 | VADR3 |
| 53 | 104 | G | OR4 | 0 | 0 | 1 | 6 | VADR4 |
| 26 | 52 | D | OR4 | 7 | 5 | 2 | 9 | VADR5 |
| 21 | 36 | C | OR4 | 8 | 6 | 2 | 10 | VADR6 |
| 56 | 115 | H | OR4 | 10 | 9 | 2 | 10 | VADR7 |
| 57 | 116 | H | OR4 | 12 | 11 | 2 | 11 | VADR8 |
| 62 | 131 | I | NOR6 | 0 | 0 | 1 | 5 | V_EMPTY |
| 77 | 181 | L | OR2 | 0 | 0 | 2 | 2 | V_FULL |
| 78 | 182 | L | OR2 | 0 | 0 | 2 | 2 | V_HFULL |
| 79 | 183 | L | NOT | 1 | 0 | 3 | 11 | V_ORDY_ |
| 80 | 184 | L | OR3 | 0 | 0 | 4 | 4 | V_SCLK_ |
| 63 | 132 | I | DFF+ | 4 | 2 | 4 | 11 | WEN |

D:\ELI\SPBUF.RPT

BURIED LOGIC

<table>
<tr><th></th><th></th><th></th><th></th><th>Expanders</th><th></th><th>Fan-In</th><th></th><th></th></tr>
<tr><th>Pin</th><th>MCell</th><th>LAB</th><th>Primitive</th><th>Total</th><th>Shared</th><th>INP</th><th>FBK</th><th>Name</th></tr>
<tr><td>-</td><td>192</td><td>L</td><td>MCELL</td><td>0</td><td>0</td><td>0</td><td>1</td><td>INIT_</td></tr>
<tr><td>-</td><td>191</td><td>L</td><td>SOFT</td><td>0</td><td>0</td><td>3</td><td>0</td><td>NEW_DATA</td></tr>
<tr><td>-</td><td>64</td><td>D</td><td>DFF</td><td>2</td><td>1</td><td>4</td><td>6</td><td>|PACK:414|~6~</td></tr>
<tr><td>-</td><td>63</td><td>D</td><td>DFF</td><td>4</td><td>1</td><td>4</td><td>6</td><td>|PACK:414|~7~</td></tr>
<tr><td>-</td><td>144</td><td>I</td><td>SOFT</td><td>0</td><td>0</td><td>0</td><td>4</td><td>|SPSEQ1:769|REFOFF</td></tr>
<tr><td>-</td><td>190</td><td>L</td><td>DFF+</td><td>14</td><td>0</td><td>3</td><td>21</td><td>|SPSEQ1:769|~25~</td></tr>
<tr><td>-</td><td>143</td><td>I</td><td>DFF+</td><td>0</td><td>0</td><td>3</td><td>12</td><td>|SPSEQ1:769|~26~</td></tr>
<tr><td>-</td><td>189</td><td>L</td><td>DFF+</td><td>0</td><td>0</td><td>2</td><td>7</td><td>|SPSEQ1:769|~27~</td></tr>
<tr><td>-</td><td>142</td><td>I</td><td>DFF+</td><td>11</td><td>3</td><td>4</td><td>19</td><td>|SPSEQ1:769|~29~</td></tr>
<tr><td>-</td><td>141</td><td>I</td><td>DFF+</td><td>14</td><td>4</td><td>4</td><td>23</td><td>|SPSEQ1:769|~31~</td></tr>
<tr><td>-</td><td>112</td><td>G</td><td>DFF+</td><td>0</td><td>0</td><td>2</td><td>4</td><td>|SPSEQ2:770|~15~</td></tr>
<tr><td>-</td><td>111</td><td>G</td><td>DFF+</td><td>0</td><td>0</td><td>2</td><td>4</td><td>|SPSEQ2:770|~16~</td></tr>
<tr><td>-</td><td>110</td><td>G</td><td>DFF+</td><td>0</td><td>0</td><td>2</td><td>4</td><td>|SPSEQ2:770|~18~</td></tr>
<tr><td>-</td><td>109</td><td>G</td><td>DFF+</td><td>0</td><td>0</td><td>2</td><td>4</td><td>|SPSEQ2:770|~19~</td></tr>
<tr><td>-</td><td>62</td><td>D</td><td>MCELL</td><td>0</td><td>0</td><td>1</td><td>3</td><td>WCRY0</td></tr>
<tr><td>-</td><td>128</td><td>H</td><td>MCELL</td><td>0</td><td>0</td><td>1</td><td>8</td><td>WCRY1</td></tr>
<tr><td>-</td><td>80</td><td>E</td><td>MCELL</td><td>0</td><td>0</td><td>0</td><td>8</td><td>WCRY2</td></tr>
<tr><td>-</td><td>108</td><td>G</td><td>SOFT</td><td>0</td><td>0</td><td>3</td><td>0</td><td>Y_INC</td></tr>
<tr><td>-</td><td>16</td><td>A</td><td>SOFT</td><td>0</td><td>0</td><td>3</td><td>0</td><td>Y_REQ</td></tr>
<tr><td>-</td><td>48</td><td>C</td><td>DFF</td><td>4</td><td>2</td><td>0</td><td>6</td><td>|4COUNT:662|QA</td></tr>
</table>

| | | | | | | | | | |
|---|---|---|---|---|---|---|---|---|---|
| - | 47 | C | DFF | 4 | 2 | 0 | 6 | 4COUNT: 662 | QB |
| - | 61 | D | DFF | 1 | 1 | 1 | 5 | 8COUNT: 119 | QA |
| - | 60 | D | DFF | 1 | 1 | 1 | 6 | 8COUNT: 119 | QB |
| - | 127 | H | DFF | 1 | 1 | 1 | 7 | 8COUNT: 119 | QC |
| - | 126 | H | DFF | 1 | 1 | 1 | 8 | 8COUNT: 119 | QD |
| - | 125 | H | DFF | 1 | 1 | 1 | 9 | 8COUNT: 119 | QE |
| - | 124 | H | DFF | 1 | 1 | 1 | 10 | 8COUNT: 119 | QF |
| - | 123 | H | DFF | 1 | 1 | 1 | 11 | 8COUNT: 119 | QG |
| - | 79 | E | DFF | 0 | 0 | 0 | 5 | 8COUNT: 122 | QA |
| - | 78 | E | DFF | 0 | 0 | 0 | 6 | 8COUNT: 122 | QB |
| - | 77 | E | DFF | 0 | 0 | 0 | 7 | 8COUNT: 122 | QC |
| - | 76 | E | DFF | 0 | 0 | 0 | 8 | 8COUNT: 122 | QD |
| - | 75 | E | DFF | 0 | 0 | 0 | 9 | 8COUNT: 122 | QE |
| - | 74 | E | DFF | 0 | 0 | 0 | 10 | 8COUNT: 122 | QF |
| - | 73 | E | DFF | 0 | 0 | 0 | 11 | 8COUNT: 122 | QG |
| - | 160 | J | DFF | 5 | 2 | 0 | 20 | 8COUNT: 131 | QA |
| - | 159 | J | DFF | 5 | 2 | 0 | 20 | 8COUNT: 131 | QB |
| - | 15 | A | DFF | 5 | 2 | 0 | 20 | 8COUNT: 131 | QC |
| - | 14 | A | DFF | 5 | 2 | 0 | 20 | 8COUNT: 131 | QD |
| - | 13 | A | DFF | 5 | 2 | 0 | 20 | 8COUNT: 131 | QE |
| - | 12 | A | DFF | 5 | 2 | 0 | 20 | 8COUNT: 131 | QF |
| - | 11 | A | DFF | 5 | 2 | 0 | 20 | 8COUNT: 131 | QG |
| - | 158 | J | DFF | 5 | 2 | 0 | 20 | 8COUNT: 132 | QA |
| - | 157 | J | DFF | 5 | 2 | 0 | 20 | 8COUNT: 132 | QB |
| - | 10 | A | DFF | 5 | 2 | 0 | 20 | 8COUNT: 132 | QC |
| - | 156 | J | DFF | 5 | 2 | 0 | 20 | 8COUNT: 132 | QD |
| - | 9 | A | DFF | 5 | 2 | 0 | 20 | 8COUNT: 132 | QE |
| (11) | 8 | A | DFF | 5 | 2 | 0 | 20 | 8COUNT: 132 | QF |
| (10) | 7 | A | DFF | 5 | 2 | 0 | 20 | 8COUNT: 132 | QG |
| - | 188 | L | DFF+ | 0 | 0 | 1 | 3 | 8COUNT: 231 | QA |
| - | 140 | I | DFF+ | 0 | 0 | 1 | 4 | 8COUNT: 231 | QB |
| - | 139 | I | DFF+ | 0 | 0 | 1 | 5 | 8COUNT: 231 | QC |
| - | 138 | I | DFF+ | 0 | 0 | 1 | 6 | 8COUNT: 231 | QD |
| - | 137 | I | DFF+ | 0 | 0 | 1 | 7 | 8COUNT: 231 | QE |
| - | 32 | B | DFF | 1 | 0 | 0 | 18 | 8COUNT: 705 | QA |
| - | 31 | B | DFF | 1 | 0 | 0 | 18 | 8COUNT: 705 | QB |
| - | 30 | B | DFF | 1 | 0 | 0 | 18 | 8COUNT: 705 | QC |
| - | 29 | B | DFF | 1 | 0 | 0 | 18 | 8COUNT: 705 | QD |
| - | 28 | B | DFF | 1 | 0 | 0 | 18 | 8COUNT: 705 | QE |
| - | 27 | B | DFF | 1 | 0 | 0 | 18 | 8COUNT: 705 | QF |
| - | 26 | B | DFF | 1 | 0 | 0 | 18 | 8COUNT: 705 | QG |
| - | 25 | B | DFF | 1 | 0 | 0 | 18 | 8COUNT: 706 | QA |
| - | 24 | B | DFF | 1 | 0 | 0 | 18 | 8COUNT: 706 | QB |
| - | 23 | B | DFF | 1 | 0 | 0 | 18 | 8COUNT: 706 | QC |
| - | 22 | B | DFF | 1 | 0 | 0 | 18 | 8COUNT: 706 | QD |
| - | 21 | B | DFF | 1 | 0 | 0 | 18 | 8COUNT: 706 | QE |
| (13) | 18 | B | DFF | 1 | 0 | 0 | 18 | 8COUNT: 706 | QF |
| (12) | 17 | B | DFF | 1 | 0 | 0 | 18 | 8COUNT: 706 | QG |
| - | 176 | K | DFF | 2 | 0 | 1 | 5 | 8COUNT: 747 | QA |
| - | 175 | K | DFF | 2 | 0 | 1 | 6 | 8COUNT: 747 | QB |
| - | 174 | K | DFF | 2 | 0 | 1 | 7 | 8COUNT: 747 | QC |
| - | 173 | K | DFF | 2 | 0 | 1 | 8 | 8COUNT: 747 | QD |
| - | 172 | K | DFF | 2 | 0 | 1 | 9 | 8COUNT: 747 | QE |
| - | 171 | K | DFF | 2 | 0 | 1 | 10 | 8COUNT: 747 | QF |
| - | 170 | K | DFF | 2 | 0 | 1 | 11 | 8COUNT: 747 | QG |
| - | 169 | K | DFF | 2 | 0 | 1 | 12 | 8COUNT: 747 | QH |
| - | 59 | D | DFF | 0 | 0 | 2 | 7 | 7474: 217 | 1Q |
| (9) | 6 | A | DFF | 3 | 3 | 1 | 24 | 7474: 217 | 2Q |
| - | 187 | L | DFF+ | 0 | 0 | 1 | 1 | 7474: 233 | 1Q |
| - | 136 | I | DFF+ | 0 | 0 | 1 | 1 | 7474: 233 | 2Q |
| - | 155 | J | DFF | 4 | 2 | 1 | 20 | 7474: 245 | 1Q |
| - | 186 | L | DFF+ | 0 | 0 | 4 | 4 | 7474: 245 | 2Q |
| - | 185 | L | DFF+ | 0 | 0 | 1 | 1 | 7474: 368 | 1Q |
| (8) | 5 | A | DFF | 0 | 0 | 1 | 2 | 7474: 398 | 1Q |
| - | 135 | I | DFF+ | 0 | 0 | 2 | 2 | 7474: 398 | 2Q |

| | | | | | | | | | |
|---|---|---|---|---|---|---|---|---|---|
| - | 154 | J | DFF | 3 | 2 | 1 | 21 | 7474: 439 | 1Q |
| (75) | 179 | L | DFF+ | 0 | 0 | 1 | 3 | 7474: 439 | 2Q |
| - | 96 | F | DFF | 0 | 0 | 1 | 1 | 7474: 440 | 1Q |
| - | 46 | C | DFF | 1 | 0 | 0 | 5 | 7474: 440 | 2Q |
| - | 134 | I | DFF+ | 0 | 0 | 2 | 0 | 7474: 509 | 1Q |
| - | 95 | F | DFF | 0 | 0 | 0 | 2 | 7474: 509 | 2Q |
| - | 168 | K | DFF | 1 | 0 | 0 | 10 | 7474: 756 | 1Q |
| - | 107 | G | DFF+ | 0 | 0 | 2 | 2 | 7474: 764 | 1Q |
| - | 106 | G | DFF+ | 0 | 0 | 1 | 3 | 7474: 764 | 2Q |
| - | 58 | D | DFF | 0 | 0 | 1 | 2 | 7474: 848 | 1Q |
| - | 153 | J | DFF | 1 | 1 | 0 | 5 | 7476: 513 | 1Q |
| - | 94 | F | DFF | 1 | 1 | 0 | 6 | 7476: 513 | 2Q |
| - | 167 | K | DFF | 0 | 0 | 0 | 3 | 7476: 636 | 2Q |
| - | 122 | H | DFF | 0 | 0 | 2 | 5 | 74161: 40 | QA |
| - | 121 | H | DFF | 5 | 0 | 2 | 6 | 74161: 40 | QB |
| - | 120 | H | DFF | 0 | 0 | 2 | 6 | 74161: 40 | QC |
| - | 57 | D | DFF | 1 | 1 | 1 | 5 | 74161: 46 | QA |
| - | 56 | D | DFF | 2 | 1 | 1 | 6 | 74161: 46 | QB |
| - | 55 | D | DFF | 0 | 0 | 2 | 5 | 74161: 462 | QA |
| - | 119 | H | DFF | 1 | 1 | 2 | 6 | 74161: 462 | QB |
| - | 118 | H | DFF | 1 | 1 | 2 | 7 | 74161: 462 | QC |
| - | 117 | H | DFF | 1 | 1 | 2 | 8 | 74161: 462 | QD |
| - | 152 | J | DFF | 3 | 3 | 1 | 21 | 74161: 473 | QA |
| - | 151 | J | DFF | 3 | 3 | 1 | 22 | 74161: 473 | QB |
| - | 150 | J | DFF | 3 | 3 | 1 | 23 | 74161: 473 | QC |
| - | 149 | J | DFF | 3 | 3 | 1 | 24 | 74161: 473 | QD |
| - | 45 | C | DFF | 0 | 0 | 0 | 4 | 74161: 709 | QA |
| - | 44 | C | DFF | 0 | 0 | 0 | 4 | 74161: 709 | QB |
| - | 93 | F | DFF | 1 | 1 | 1 | 3 | 74164: 475 | QA |
| - | 92 | F | DFF | 1 | 1 | 1 | 4 | 74164: 475 | QB |
| - | 91 | F | DFF | 1 | 1 | 1 | 4 | 74164: 475 | QC |
| - | 90 | F | DFF | 1 | 1 | 1 | 4 | 74164: 475 | QD |
| - | 89 | F | DFF | 1 | 1 | 1 | 3 | 74164: 475 | QE |
| (33) | 83 | F | DFF | 0 | 0 | 0 | 3 | 74273: 544 | : 17 |
| (32) | 82 | F | DFF | 0 | 0 | 0 | 3 | 74273: 544 | : 18 |
| (31) | 81 | F | DFF | 0 | 0 | 0 | 3 | 74273: 544 | : 19 |
| (7) | 4 | A | DFF | 0 | 0 | 2 | 0 | 74273: 692 | : 12 |
| (6) | 3 | A | DFF | 0 | 0 | 2 | 0 | 74273: 692 | : 13 |
| (68) | 148 | J | DFF | 0 | 0 | 2 | 0 | 74273: 692 | : 14 |
| (5) | 2 | A | DFF | 0 | 0 | 2 | 0 | 74273: 692 | : 15 |
| - | 54 | D | DFF | 0 | 0 | 2 | 0 | 74273: 692 | : 16 |
| - | 53 | D | DFF | 0 | 0 | 2 | 0 | 74273: 692 | : 17 |
| - | 43 | C | DFF | 0 | 0 | 2 | 0 | 74273: 692 | : 18 |
| - | 42 | C | DFF | 0 | 0 | 2 | 0 | 74273: 692 | : 19 |
| - | 72 | E | DFF | 0 | 0 | 2 | 0 | 74273: 693 | : 12 |
| - | 41 | C | DFF | 0 | 0 | 2 | 0 | 74273: 693 | : 13 |
| (14) | 19 | B | DFF | 0 | 0 | 2 | 0 | 74273: 693 | : 14 |
| (15) | 20 | B | DFF | 0 | 0 | 2 | 0 | 74273: 693 | : 15 |
| - | 71 | E | DFF | 0 | 0 | 2 | 0 | 74273: 693 | : 16 |
| - | 70 | E | DFF | 0 | 0 | 2 | 0 | 74273: 693 | : 17 |
| - | 69 | E | DFF | 0 | 0 | 2 | 0 | 74273: 693 | : 18 |
| - | 40 | C | DFF | 0 | 0 | 2 | 0 | 74273: 693 | : 19 |
| - | 166 | K | DFF | 0 | 0 | 1 | 1 | 74273: 759 | : 16 |
| - | 165 | K | DFF | 0 | 0 | 1 | 1 | 74273: 759 | : 17 |
| (72) | 164 | K | DFF | 0 | 0 | 1 | 1 | 74273: 759 | : 18 |
| (71) | 163 | K | DFF | 0 | 0 | 1 | 1 | 74273: 759 | : 19 |

D:\ELI\SPBUF.RPT

```
** MACROCELL INTERCONNECTION CROSS REFERENCE **

Logic Array Block "A":

        M M M M M M M M M M M M M M M
        C C C C C C C C C C C C C C C
        1 1 1 1 1 1 1 9 8 7 6 5 4 3 2
        6 5 4 3 2 1 0 | | | | | | | |
        | | | | | | | | | | | | | | |   | A B C D E F G H I J K L | Name
MC16  -> - * * * * * * * * * - - - - -  | @ - * - - - - - - * - * | Y_REQ
MC15  -> - * * * * * * * * * * - - - -  | @ - - - * - - - - * - - | |8COUNT: 131|QC
MC14  -> - * * * * * * * * * * - - - -  | @ - - - - - * - - * - - | |8COUNT: 131|QD
MC13  -> - * * * * * * * * * * - - - -  | @ - - - - - * - - * - - | |8COUNT: 131|QE
MC12  -> - * * * * * * * * * * - - - -  | @ - - * - - - - - * - - | |8COUNT: 131|QF
MC11  -> - * * * * * * * * * * - - - -  | @ - * - - - - - - * - - | |8COUNT: 131|QG
MC10  -> - * * * * * * * * * * - - - -  | @ - - - - - * - - * - - | |8COUNT: 132|QC
MC9   -> - * * * * * * * * * * - - - -  | @ - * - - - - - - * - - | |8COUNT: 132|QE
MC8   -> - * * * * * * * * * * - - - -  | @ - - - - - - * - * - - | |8COUNT: 132|QF
MC7   -> - * * * * * * * * * * - - - -  | @ - - - - - - * - * - - | |8COUNT: 132|QG
MC6   -> - - - - - - - - - - - - - - -  | @ - - - - - - - * - - * | |7474: 217|2Q
MC5   -> - - - - - - - - - - - - - - -  | @ - - - - - - - * - - - | |7474: 398|1Q
MC4   -> - - - - - - - - * - - - - - -  | @ * - - - - - * - - - - | |74273: 692|: 12
MC3   -> - - - - - - - * - - - - - - -  | @ * - - - - - * - - - - | |74273: 692|: 13
MC2   -> - - - - - - * - - - - - - - -  | @ * - - - - - * - - - - | |74273: 692|: 15

@84   -> - - - - - - - - - - - - - - -  | - - * * * * * * * - * * | ATE
@4    -> - - - - - - - - - - - * - - -  | @ - - - - - - - - - * - | BUF_SI
@1    -> - - - - - - - - - - - - - - -  | - - - - - - * - * - - * | CLK1
@83   -> - - - - - - - - - - - - * * *  | * - * * - - - - - * - - | LD_PAR1
@44   -> - - - - - - - - - - * - - - -  | * - * * * * - * - * - - | MB_1
@43   -> - - - - - - - - - - - - - - *  | * * - * - - - * - - - - | MB_4
@42   -> - - - - - - - - - - - - - - -  | - * * * - - - * * * - * | MB_5
@41   -> * - - - - - - - - - - - - * -  | * - * - - - * - - * - * | MB_6
@75   -> * - - - - - - - - - - - * - -  | * - - - * - - - - - - @ | MB_7
@2    -> - - - - - - - - - - - - - - -  | - - - * - - * - * - - * | RST1
@71   -> * - - - - - - - - - - - - - -  | * - - - - - - - - - @ - | SP_REQ
MC192-> - * * * * * * * * * * * - - -  | * * * * * * * * * * * @ | INIT_
MC191-> - * * * * * * * * * * - - - -  | * - * - - - - - - * - @ | NEW_DATA
MC145-> - - - - - - - - - - * - - - -  | * - - - - * - - - @ - - | ORDER0
MC146-> - - - - - - - - - - * - - - -  | * - - - - * - - - @ - - | ORDER1
MC147-> - - - - - - - - - - * - - - -  | * - - - - * - - - @ - - | ORDER2
MC143-> - * * * * * * * * * * * - - -  | * * * * * - - * @ * * * | |SPSEQ1: 769|~26~
MC108-> - - - - - - - - - - * - - - -  | * - - - - * @ - - * - - | Y_INC
MC48  -> - * * * * * * * * * * - - - -  | * - @ - * - - - - * - - | |4COUNT: 662|QA
MC47  -> - * * * * * * * * * * - - - -  | * - @ - - - - - - * - - | |4COUNT: 662|QB
MC160-> - * * * * * * * * * * - - - -  | * - - - * - - - - @ - - | |8COUNT: 131|QA
MC159-> - * * * * * * * * * * - - - -  | * - * - - - - - - @ - - | |8COUNT: 131|QB
MC158-> - * * * * * * * * * * - - - -  | * - - - * - - - - @ - - | |8COUNT: 132|QA
MC157-> - * * * * * * * * * * - - - -  | * - - - - - * - - @ - - | |8COUNT: 132|QB
MC156-> - * * * * * * * * * * - - - -  | * - - * - - - - - @ - - | |8COUNT: 132|QD
MC136-> - - - - - - - - - - * - - - -  | * - - - - - - - @ - - * | |7474: 233|2Q
MC72  -> - - - - - * - - - - - - - - -  | * * - - @ - - - - - - - | |74273: 693|: 12
MC41  -> - - - - * - - - - - - - - - -  | * * @ - * - - - - - - - | |74273: 693|: 13
MC19  -> - - - * - - - - - - - - - - -  | * @ - - * - - - - - - - | |74273: 693|: 14
MC20  -> - - * - - - - - - - - - - - -  | * @ - - * - - - - - - - | |74273: 693|: 15
MC71  -> - * - - - - - - - - - - - - -  | * * - - @ - - - - - - - | |74273: 693|: 16
MC40  -> - - - - - - - - - * - - - - -  | * * @ - - - - * - - - - | |74273: 693|: 19
```

D: \ELI\SPBUF.RPT

MACROCELL INTERCONNECTION CROSS REFERENCE

Logic Array Block "B":

```
          M M M M M M M M M M M M M M M M
          C C C C C C C C C C C C C C C C
          3 3 3 2 2 2 2 2 2 2 2 2 1 1 1 2
          2 1 0 9 8 7 6 5 4 3 2 1 8 7 9 0
          | | | | | | | | | | | | | | | |   | A B C D E F G H I J K L | Name
MC32   -> * * * * * * * * * * * * * * - -   | - @ - - * - - - - - - - | |8COUNT: 705 |QA
MC31   -> * * * * * * * * * * * * * * - -   | - @ - - - - * - - - - - | |8COUNT: 705 |QB
MC30   -> * * * * * * * * * * * * * * - -   | - @ - - - - * - - - - - | |8COUNT: 705 |QC
MC29   -> * * * * * * * * * * * * * * - -   | - @ - * - - - - - - - - | |8COUNT: 705 |QD
MC28   -> * * * * * * * * * * * * * * - -   | - @ * - - - - - - - - - | |8COUNT: 705 |QE
MC27   -> * * * * * * * * * * * * * * - -   | - @ - - - - - * - - - - | |8COUNT: 705 |QF
MC26   -> * * * * * * * * * * * * * * - -   | - @ - - - - - * - - - - | |8COUNT: 705 |QG
MC25   -> * * * * * * * * * * * * * * - -   | - @ - - * - - - - - - - | |8COUNT: 706 |QA
MC24   -> * * * * * * * * * * * * * * - -   | - @ * - - - - - - - - - | |8COUNT: 706 |QB
MC23   -> * * * * * * * * * * * * * * - -   | - @ - - * - - - - - - - | |8COUNT: 706 |QC
MC22   -> * * * * * * * * * * * * * * - -   | - @ - - - - * - - - - - | |8COUNT: 706 |QD
MC21   -> * * * * * * * * * * * * * * - -   | - @ - - - - * - - - - - | |8COUNT: 706 |QE
MC18   -> * * * * * * * * * * * * * * - -   | - @ - * - - - - - - - - | |8COUNT: 706 |QF
MC17   -> * * * * * * * * * * * * * * - -   | - @ * - - - - - - - - - | |8COUNT: 706 |QG
MC19   -> - - - - - - - - - - - * - - - -   | * @ - - * - - - - - - - | |74273: 693 |: 14
MC20   -> - - - - - - - - - - * - - - - -   | * @ - - * - - - - - - - | |74273: 693 |: 15

@84    -> - - - - - - - - - - - - - - - -   | - - * * * * * * * - * * | ATE
@1     -> - - - - - - - - - - - - - - - -   | - - - - - - * - * - - * | CLK1
@83    -> - - - - - - - - - - - - - - - -   | * - * * - - - - - * - - | LD_PAR1
@47    -> - - - - - - - - - - - - - - * *   | - * * - * - @ - - - - - | LD_PAR2
@44    -> - - - - - - - - - - - - - - - -   | * - * * * * - * - * - - | MB_1
@43    -> - - - - - - - - - - - - - - - *   | * * - * - - - * - - - - | MB_4
@42    -> - - - - - - - - - - - - - - * -   | - * * * - - - * * * - * | MB_5
@41    -> - - - - - - - - - - - - - - - -   | * - * - - - * - - * - * | MB_6
@2     -> - - - - - - - - - - - - - - - -   | - - - * - - * - * - - * | RST1
MC192  -> * * * * * * * * * * * * * * - -   | * * * * * * * * * * * @ | INIT
MC143  -> * * * * * * * * * * * * * * - -   | * * * * * - - * @ * * * | |SPSEQ1: 769 |-26-
MC45   -> * * * * * * * * * * * * * * - -   | - * @ - * - - - - - * - | |74161: 709 |QA
MC44   -> * * * * * * * * * * * * * * - -   | - * @ - - - - - - - * - | |74161: 709 |QB
MC4    -> - - - - - * - - - - - - - - - -   | @ * - - - - - * - - - - | |74273: 692 |: 12
MC3    -> - - - - * - - - - - - - - - - -   | @ * - - - - - * - - - - | |74273: 692 |: 13
MC148  -> - - - * - - - - - - - - - - - -   | - * - - - - - * - @ - - | |74273: 692 |: 14
MC2    -> - - * - - - - - - - - - - - - -   | @ * - - - - - * - - - - | |74273: 692 |: 15
MC54   -> - * - - - - - - - - - - - - - -   | - * - @ - - - - - * - - | |74273: 692 |: 16
MC53   -> * - - - - - - - - - - - - - - -   | - * - @ - - - - - * - - | |74273: 692 |: 17
MC72   -> - - - - - - - - - - - - - * - -   | * * - - @ - - - - - - - | |74273: 693 |: 12
MC41   -> - - - - - - - - - - - - * - - -   | * * @ - * - - - - - - - | |74273: 693 |: 13
MC71   -> - - - - - - - - - * - - - - - -   | * * - - @ - - - - - - - | |74273: 693 |: 16
MC70   -> - - - - - - - - * - - - - - - -   | - * - - @ - - - - * - - | |74273: 693 |: 17
MC69   -> - - - - - - - * - - - - - - - -   | - * - - @ - - - - * - - | |74273: 693 |: 18
MC40   -> - - - - - - * - - - - - - - - -   | * * @ - - - - * - - - - | |74273: 693 |: 19
```

D: \ELI\SPBUF.RPT

MACROCELL INTERCONNECTION CROSS REFERENCE

Logic Array Block "C":

```
          M M M M M M M M M M M M M
          C C C C C C C C C C C C C
          3 3 3 3 4 4 4 4 4 4 4 4 4
          3 4 5 6 8 7 6 5 4 3 2 1 0
          | | | | | | | | | | | | |   | A B C D E F G H I J K L | Name
MC33   -> - - - - - - - - - - - - -   | - - @ - - - - - - - - - | LWADR1
MC34   -> - - - - - - - - - - - - -   | - - @ - - - - - - - - - | LWADR6
```

```
MC35 -> - - - - - - - - - - - - - | - - @ - - - - - - - - - | VADR1
MC36 -> - - - - - - - - - - - - - | - - @ - - - - - - - - - | VADR6
MC48 -> - - - - * * - - - - - - - | * - @ - * - - - - * - - | |4COUNT: 662 |QA
MC47 -> * - * - * * - - - - - - - | * - @ - - - - - - * - - | |4COUNT: 662 |QB
MC46 -> - - - - - - - - - - - - - | - - @ - - * - - * - - - | |7474: 440 |2Q
MC45 -> - - - - - - - * * - - - - | - * @ - * - - - - - * - | |74161: 709 |QA
MC44 -> * - - - - - - * * - - - - | - * @ - - - - - - - * - | |74161: 709 |QB
MC43 -> - - - - - * - - * - - - - | - - @ * - - - - - - - - | |74273: 692 |: 18
MC42 -> - - - - * - - * - - - - - | - - @ * - - - - - * - - | |74273: 692 |: 19
MC41 -> - - - - - - - - - - - - - | * * @ - * - - - - - - - | |74273: 693 |: 13
MC40 -> - - - - - - - - - - - - - | * * @ - - - - * - - - - | |74273: 693 |: 19

@84   -> * * * * - - - - - - - - - | - - * * * * * * * - * * | ATE
@1    -> - - - - - - - - - - - - - | - - - - - - * - * - - * | CLK1
@83   -> - - - - - - - - - * * - - | * - * * - - - - - * - - | LD_PAR1
@47   -> - - - - - - - - - - - * * | - * * - * - @ - - - - - | LD_PAR2
@51   -> - - - - - - - - - - * - * | - - * - - - @ - * - - - | MB_0
@44   -> - - - - - - - - - * - - - | * - * * * * - * - * - - | MB_1
@43   -> - - - - - - - - - - - - - | * * - * - - - * - - - - | MB_4
@42   -> - * - * - - - - - - - - - | - * * * - - - * * * - * | MB_5
@41   -> - - - - - - - - - - - * - | * - * - - - * - - * - * | MB_6
@2    -> - - - - - - - - - - - - - | - - - * - - * - * - - * | RST1
MC192-> - - - - * * - * * - - - - | * * * * * * * * * * * @ | INIT_
MC191-> - - - - * * - - - - - - - | * - * - - - - - - * - @ | NEW_DATA
MC143-> - - - - * * * * * - - - - | * * * * * - - * @ * * * | |SPSEQ1: 769 |~26~
MC141-> * * * * - - * - - - - - - | - - * * * - * * @ * - * | |SPSEQ1: 769 |~31~
MC180-> * * * * - - * - - - - - - | - - * * * * * * * * - @ | TRG
MC128-> - - - - - - * - - - - - - | - - * - * - - @ - - - - | WCRY1
MC132-> - - - - - - * - - - - - - | - - * - - - - - @ - - * | WEN
MC16 -> - - - - * * - - - - - - - | @ - * - - - - - - * - * | Y_REQ
MC125-> - - - * - - - - - - - - - | - - * - - - - @ - - - - | |8COUNT: 119 |QE
MC78 -> - - * - - - - - - - - - - | - - * - @ - - - - - - - | |8COUNT: 122 |QB
MC73 -> - - - * - - - - - - - - - | - - * - @ - - - - - - - | |8COUNT: 122 |QG
MC159-> * - * - - - - - - - - - - | * - * - - - - - - @ - - | |8COUNT: 131 |QB
MC11 -> - * - * - - - - - - - - - | @ - * - - - - - - * - - | |8COUNT: 131 |QG
MC9  -> - * - * - - - - - - - - - | @ - * - - - - - - * - - | |8COUNT: 132 |QE
MC28 -> - * - - - - - - - - - - - | - @ * - - - - - - - - - | |8COUNT: 705 |QE
MC24 -> * - - - - - - - - - - - - | - @ * - - - - - - - - - | |8COUNT: 706 |QB
MC17 -> - * - - - - - - - - - - - | - @ * - - - - - - - - - | |8COUNT: 706 |QG
MC153-> - * - * - - - - - - - - - | - - * * - * - * - @ - - | |7476: 513 |1Q
MC56 -> - - * - - - - - - - - - - | - - * @ - - - - - - - - | |74161: 46 |QB
MC119-> - * - * - - - - - - - - - | - - * - - - - @ - - - - | |74161: 462 |QB
MC152-> - * - * - - - - - - - - - | - - * * - - - * - @ - - | |74161: 473 |QA
MC151-> - * - * - - - - - - - - - | - - * - - - - * - @ - - | |74161: 473 |QB
```

D: \ELI\SPBUF.RPT

MACROCELL INTERCONNECTION CROSS REFERENCE

Logic Array Block "D":

```
        M M M M M M M M M M M M M M M M
        C C C C C C C C C C C C C C C C
        4 5 6 6 5 5 6 6 6 5 5 5 5 5 5 5
        9 0 4 3 1 2 2 1 0 9 8 7 6 5 4 3
        | | | | | | | | | | | | | | | | | A B C D E F G H I J K L | Name
MC49 -> - - - - - - - - - - - - - - - - | - - - @ - - - - - - - - | LOWER_
MC50 -> - - - - - - - - - - - - - - - - | - - - @ - - - - - - - - | LWADR5
MC64 -> - - * * - - - - - - - - - - - - | - - - @ - - - - - - - - | |PACK: 414 |~6~
MC63 -> * - * * * - - - - - - - - - - - | - - - @ - - - - * - - * | |PACK: 414 |~7~
MC51 -> * - - - * - - - - - - - - - - - | - - - @ - - - - - - - - | UPPER_
MC52 -> - - - - - - - - - - - - - - - - | - - - @ - - - - - - - - | VADR5
MC62 -> - - - - - - - * * * - * * * - - | - - - @ - - - * - - - - | WCRY0
MC61 -> - - - - - - - * * - - - - - - - | - - - @ * - - * - - - - | |8COUNT: 119 |QA
MC60 -> - - - - - - - - * - - - - - - - | - - - @ - - * * - - - - | |8COUNT: 119 |QB
```

```
MC59 -> - - - - - - - - - - - - - - - - | - - - @ - - - - * - - * | |7474: 217 |1Q
MC58 -> - - - - - - - - - * - - - - -   | - - - @ - - - - - - - - | |7474: 848 |1Q
MC57 -> - - - - - - * - - - - * * - - - | - - - @ * - - - - - - - | |74161: 46 |QA
MC56 -> - - - - - - * - - - - - * - - - | - - * @ - - - - - - - - | |74161: 46 |QB
MC55 -> - * - - - * - - - - - - - * - - | - - - @ - - - * - - - - | |74161: 462 |QA
MC54 -> - - - - - - - - * - - - - - - - | - * - @ - - - - - * - - | |74273: 692 |: 16
MC53 -> - - * * - - - * - - - - - - - - | - * - @ - - - - - * - - | |74273: 692 |: 17

@84  -> * * - - * * - - - - - - - - - - | - - * * * * * * * - * * | ATE
@1   -> - - - - - - - - - - - - - - - - | - - - - - - * - * - - * | CLK1
@33  -> - - - - - - - - - - * - - - - - | - - - * - @ - - - - - - | EOP
@83  -> - - - - - - - - - - - - - - * * | * - * * - - - - - * - - | LD_PAR1
@44  -> - - - - - - - - - * - - - * - - | * - * * * * - * - * - - | MB_1
@73  -> - - * * - - - - - - - - - - - * | - - - * * - - - - - - @ | MB_2
@74  -> - - * * - - - - - - - - - - * - | - - - * * - - - - - - @ | MB_3
@43  -> - - * * - - * * * * - * * * - - | * * - * - - - * - - - - | MB_4
@42  -> - * - - - * - - - - - - - - - - | - * * * - - - * * * - * | MB_5
@41  -> - - - - - - - - - - - - - - - - | * - * - - - - - - * - * | MB_6
@2   -> - - * * - - - - - - - - - - - - | - - - * - - * - * - - * | RST̅1
MC192-> * - * * * - - * * * * * * * - - | * * * * * * * * * * * @ | INIT_
MC143-> * - * * * - - * * * - * * * - - | * * * * * - - * @ * * * | |SPSE̅Q1: 769 |-26-
MC141-> - * - - - * - - - - - - - - - - | - - * * * - * * @ * - * | |SPSEQ1: 769 |-31-
MC180-> - * - - - * - - - - - - - - - - | - - * * * * * * * * - @ | TRG
MC80 -> - - * * - - * * * * - * * * - - | - - - * @ - - * - - - - | WCRY2
MC126-> - - - - - * - - - - - - - - - - | - - - * - - - @ - - - - | |8COUNT: 119 |QD
MC74 -> - - - - - * - - - - - - - - - - | - - - * @ - - - - - - - | |8COUNT: 122 |QF
MC12 -> - * - - - * - - - - - - - - - - | @ - - * - - - - - * - - | |8COUNT: 131 |QF
MC156-> - * - - - * - - - - - - - - - - | * - - * - - - - - @ - - | |8COUNT: 132 |QD
MC29 -> - * - - - - - - - - - - - - - - | - @ - * - - - - - - - - | |8COUNT: 705 |QD
MC18 -> - * - - - - - - - - - - - - - - | - @ - * - - - - - - - - | |8COUNT: 706 |QF
MC187-> - - - - - - - - - * * - - - - - | - - - * - - - - * - - @ | |7474: 233 |1Q
MC153-> - * - - - * - - - - - - - - - - | - - * * - * - * - @ - - | |7476: 513 |1Q
MC120-> - - - - - - - - - * - - - * - - | - - - * - * - @ - - - - | |74161: 40 |QC
MC152-> - * - - - * - - - - - - - - - - | - - * * - - - * - @ - - | |74161: 473 |QA
MC43 -> - - - - - - - - - - - - * - - - | - - @ * - - - - - - - - | |74273: 692 |: 18
MC42 -> - - * * - - - - - - - * - - - - | - - @ * - - - - - * - - | |74273: 692 |: 19
```

D: \ELI\SPBUF.RPT

MACROCELL INTERCONNECTION CROSS REFERENCE

Logic Array Block "E":

```
         M M M M M M M M M M M M M M M M
         C C C C C C C C C C C C C C C C
         6 6 6 6 8 7 7 7 7 7 7 7 7 7 7 6
         5 6 7 8 0 9 8 7 6 5 4 3 2 1 0 9
         | | | | | | | | | | | | | | | | | A B C D E F G H I J K L | Name
MC65  -> - - - - - - - - - - - - - - - - | - - - - @ - - - - - - - | LWADR0
MC66  -> - - - - - - - - - - - - - - - - | - - - - @ - - - - - - - | LWADR2
M 67  -> - - - - - - - - - - - - - - - - | - - - - @ - - - - - - - | VADR0
MC68  -> - - - - - - - - - - - - - - - - | - - - - @ - - - - - - - | VADR2
MC80  -> - - - - - * * * * * * * - - - - | - - - * @ - - * - - - - | WCRY2
MC79  -> - - * - * * * * * * * * - - - - | - - - - @ - - - - - - - | |8COUNT: 122 |QA
MC78  -> - - - - * - * * * * * * - - - - | - - * - @ - - - - - - - | |8COUNT: 122 |QB
MC77  -> - - - * * - - * * * * * - - - - | - - - - @ - - - - - - - | |8COUNT: 122 |QC
MC76  -> - - - - * - - - * * * * - - - - | - - - - @ - * - - - - - | |8COUNT: 122 |QD
MC75  -> - - - - * - - - - * * * - - - - | - - - - @ - * - - - - - | |8COUNT: 122 |QE
MC74  -> - - - - * - - -   - * * - - - - | - - - * @ - - - - - - - | |8COUNT: 122 |QF
MC73  -> - - - - * - - - - - - * - - - - | - - * - @ - - - - - - - | |8COUNT: 122 |QG
MC72  -> - - - - - - - - - - - * - - - - | * * - - @ - - - - - - - | |74273: 693 |: 12
MC71  -> - - - - - - - * - - - - - - - - | * * - - @ - - - - - - - | |74273: 693 |: 16
MC70  -> - - - - - - * - - - - - - - - - | - * - - @ - - - - * - - | |74273: 693 |: 17
MC69  -> - - - - - * - - - - - - - - - - | - * - - @ - - - - * - - | |74273: 693 |: 18

@84   -> * * * * - - - - - - - - - - - - | - - * * * * * * * - * * | ATE
@1    -> - - - - - - - - - - - - - - - - | - - - - - - * - * - - * | CLK1
```

```
@83   -> - - - - - - - - - - - - - - - - | * - * * - - - - - * - - | LD_PAR1
@47   -> - - - - - - - - - - - - * * * * | - * * - * - @ - - - - - | LD_PAR2
@44   -> - - - - - - - - - - - - - - - * | * - * * * * - * - * - - | MB_1
@73   -> - - - - - - - - - - - - - - * - | - - - * * - - - - - - @ | MB_2
@74   -> - - - - - - - - - - - - - * - - | - - - * * - - - - - - @ | MB_3
@43   -> - - - - - - - - - - - - - - - - | * * - * - - - * - - - - | MB_4
@42   -> - - - - - - - - - - - - - - - - | - * * * - - - * * * - * | MB_5
@41   -> - - - - - - - - - - - - - - - - | * - * - - - * - - * - * | MB_6
@75   -> - - - - - - - - - - - - * - - - | * - - - * - - - - - - @ | MB_7
@2    -> - - - - - - - - - - - - - - - - | - - - * - - * - * - - * | RST1
MC192-> - - - - - * * * * * * * - - - - | * * * * * * * * * * * @ | INIT
MC143-> - - - - - * * * * * * * - - - - | * * * * * - - * @ * * * | |SPSEQ1: 769 |~26~
MC141-> * * * * - - - - - - - - - - - - | - - * * * - * * @ * - * | |SPSEQ1: 769 |~31~
MC180-> * * * * - - - - - - - - - - - - | - - * * * * * * * * - @ | TRG
MC128-> - - - - * * * * * * * * - - - - | - - * - * - - @ - - - - | WCRY1
MC48 -> * - * - - - - - - - - - - - - - | * - @ - * - - - - * - - | |4COUNT: 662 |QA
MC61 -> - - - * - - - - - - - - - - - - | - - - @ * - - * - - - - | |8COUNT: 119 |QA
MC160-> * - * - - - - - - - - - - - - - | * - - - * - - - - @ - - | |8COUNT: 131 |QA
MC15 -> - * - * - - - - - - - - - - - - | @ - - - * - - - - * - - | |8COUNT: 131 |QC
MC158-> - * - * - - - - - - - - - - - - | * - - - * - - - - @ - - | |8COUNT: 132 |QA
MC32 -> - * - - - - - - - - - - - - - - | - @ - - * - - - - - - - | |8COUNT: 705 |QA
MC25 -> * - - - - - - - - - - - - - - - | - @ - - * - - - - - - - | |8COUNT: 706 |QA
MC23 -> - * - - - - - - - - - - - - - - | - @ - - * - - - - - - - | |8COUNT: 706 |QC
MC57 -> - - * - - - - - - - - - - - - - | - - - @ * - - - - - - - | |74161: 46 |QA
MC45 -> * - - - - - - - - - - - - - - - | - * @ - * - - - - - * - | |74161: 709 |QA
MC41 -> - - - - - - - - - - * - - - - - | * * @ - * - - - - - - - | |74273: 693 |: 13
MC19 -> - - - - - - - - - * - - - - - - | * @ - - * - - - - - - - | |74273: 693 |: 14
MC20 -> - - - - - - - - * - - - - - - - | * @ - - * - - - - - - - | |74273: 693 |: 15
```

D: \ELI\SPBUF.RPT

MACROCELL INTERCONNECTION CROSS REFERENCE

Logic Array Block "F":

```
         M M M M M M M M M M M M M M M M
         C C C C C C C C C C C C C C C C
         8 8 8 8 8 9 9 9 9 9 9 9 8 8 8 8
         4 5 6 7 8 6 5 4 3 2 1 0 9 3 2 1
         | | | | | | | | | | | | | | | | | A B C D E F G H I J K L | Name
MC84 -> - - - - - - - - - - - - - - - - | - - - - - @ - - - - - - | RAS0
MC85 -> - - - - - - - - - - - - - - - - | - - - - - @ - - - - - - | RAS1
MC86 -> - - - - - - - - - - - - - - - - | - - - - - @ - - - - - - | RAS2
MC87 -> - - - - - - - - - - - - - - - - | - - - - - @ - - - - - - | RAS3
MC88 -> - - - - - - - - - - - - - - - - | - - - - - @ - - - - - - | RAS4
MC96 -> - - - - - - - - - - - - - - - - | - - - - - @ - - * - - * | |7474: 440 |1Q
MC95 -> * * * * * - - - - - - - - - - - | - - - - - @ - - - - - - | |7474: 509 |2Q
MC94 -> - - - - - - - * - - - - - - - - | - - - - - @ - - - - - * | |7476: 513 |2Q
MC93 -> * - - - - - - - - * - - - - - - | - - - - - @ - - - - - - | |74164: 475 |QA
MC92 -> - * - - - - - - - - * - - - - - | - - - - - @ - - - - - - | |74164: 475 |QB
MC91 -> - - * - - - - - - - - * - - - - | - - - - - @ - - - - - - | |74164: 475 |QC
MC90 -> - - - * - - - - - - - - * - - - | - - - - - @ - - - - - - | |74164: 475 |QD
MC89 -> - - - - * - - - * * * * * - - - | - - - - - @ - - - - - - | |74164: 475 |QE
MC83 -> * * * * * - - - - - - - - - - - | - - - - - @ - - - - - - | |74273: 544 |: 17
MC82 -> * * * * * - - - - - - - - - - - | - - - - - @ - - - - - - | |74273: 544 |: 18
MC81 -> * * * * * - - - - - - - - - - - | - - - - - @ - - - - - - | |74273: 544 |: 19

@84   -> * * * * * - - - - - - - - - - - | - - * * * * * * * - * * | ATE
@1    -> - - - - - - - - - - - - - - - - | - - - - - - * - * - - * | CLK1
@83   -> - - - - - - - - - - - - - - - - | * - * * - - - - - * - - | LD_PAR1
@44   -> - - - - - - - - * * * * * - - - | * - * * * * - * - * - - | MB_1
@43   -> - - - - - - - - - - - - - - - - | * * - * - - - * - - - - | MB_4
@42   -> - - - - - - - - - - - - - - - - | - * * * - - - * * * - * | MB_5
@41   -> - - - - - - - - - - - - - - - - | * - * - - - * - - * - * | MB_6
@59   -> - - - - - * - - - - - - - - - - | - - - - - * - - @ - - - | REF_ON
@2    -> - - - - - - - - - - - - - - - - | - - - * - - * - * - - * | RST1
MC192-> - - - - - - - * * * * * * * * * | * * * * * * * * * * * @ | INIT
```

```
MC145-> - - - - - - - * - - - - - - - - | * - - - - * - - - @ - - | ORDER0
MC146-> - - - - - - - * - - - - - - - - | * - - - - * - - - @ - - | ORDER1
MC147-> - - - - - - - * - - - - - - - - | * - - - - * - - - @ - - | ORDER2
MC144-> - - - - - * * - - - - - - - - - | - - - - - * - - @ - - - | |SPSEQ1: 769|REFOFF
MC190-> - - - - - - * - - - - - - - - - | - - - - - * - - * - * @ | |SPSEQ1: 769|-25-
MC142-> * * * * * - - * - - - - - - - - | - - - - - * - - @ - - * | |SPSEQ1: 769|-29-
MC180-> * * * * * - - * - - - - - - - - | - - * * * * * * * * - @ | TRG
MC108-> - - - - - - - - * * * * * - - - | * - - - - * @ - - * - - | Y_INC
MC46 -> - - - - - - - - - - - - - * * * | - - @ - - * - - * - - - | |7474: 440|2Q
MC153-> * * * * * - - - - - - - - - - - | - - * * - * - * - @ - - | |7476: 513|1Q
MC122-> - - - - - - - - - - - - - - - * | - - - - - * - @ - - - - | |74161: 40|QA
MC121-> - - - - - - - - - - - - - - * - | - - - - - * - @ - - - - | |74161: 40|QB
MC120-> - - - - - - - - - - - - - * - - | - - - * - * - @ - - - - | |74161: 40|QC
```

D: \ELI\SPBUF.RPT

MACROCELL INTERCONNECTION CROSS REFERENCE

Logic Array Block "G":

```
        M M M M M M M M M M M M
        C C C C C C C C C C C C
        9 1 1 1 1 1 1 1 1 1 1 1
        7 0 0 1 1 1 0 0 0 0 0 0
        | 0 1 2 1 0 9 3 4 8 7 6 | A B C D E F G H I J K L | Name
MC97 -> * - - * * * * - - - * * | - - - - - - @ - - - - - | DSP_STR
MC100-> - - - - - - - - - - - - | - - - - - - @ - - - - - | LWADR3
MC101-> - - - - - - - - - - - - | - - - - - - @ - - - - - | LWADR4
MC112-> * - - * * * * - - - - - | - - - - - - @ - - - - - | |SPSEQ2: 770|-15-
MC111-> * - - * * * * - - - - - | - - - - - - @ - - - - - | |SPSEQ2: 770|-16-
MC110-> * - - * * * * - - - - - | - - - - - - @ - - - * - | |SPSEQ2: 770|-18-
MC109-> * - - * * * * - - - - - | - - - - - - @ - - - * - | |SPSEQ2: 770|-19-
MC103-> - - - - - - - - - - - - | - - - - - - @ - - - - - | VADR3
MC104-> - - - - - - - - - - - - | - - - - - - @ - - - - - | VADR4
MC108-> - - - - - - - - - - - - | * - - - - * @ - - * - - | Y_INC
MC107-> - - - - - - - - - - - * | - - - - - - @ - - - - - | |7474: 764|1Q
MC106-> * - - - - - - - - - - - | - - - - - - @ - - - - - | |7474: 764|2Q

@84  -> * * * - - - - * * - - - | - - * * * * * * * - * * | ATE
@1   -> * - - * * * * - - - * * | - - - - - - * - * - - * | CLK1
@5   -> - - - - - - - - - - * - | @ - - - - - * - - - - - | DSP_RDY
@83  -> - - - - - - - - - - - - | * - * * - - - - - * - - | LD_PAR1
@44  -> - - - - - - - - - - - - | * - * * * * - * - * - - | MB_1
@43  -> - - - - - - - - - - - - | * * - * - - - * - - - - | MB_4
@42  -> - - - - - - - - - - - - | - * * * - - - * * * - * | MB_5
@41  -> - - - - - - - - - * - - | * - * - - - * - - * - * | MB_6
@2   -> * - - * * * * - - - - - | - - - * - - * - * - - * | RST1
@68  -> - - - - - - - - - * - - | - - - - - - * - - @ - - | SP_INC
@12  -> - - - - - - - - - * - - | - @ - - - - * - - - - - | TST_INC
MC192-> - - - - - - - - - - * * | * * * * * * * * * * * @ | INIT
MC141-> - * * - - - - * * - - - | - - * * * - * * @ * - * | |SPSEQ1: 769|-31-
MC180-> - * * - - - - * * - - - | - - * * * * * * * * - @ | TRG
MC60 -> - - - - - - - * - - - - | - - - @ - - * * - - - - | |8COUNT: 119|QB
MC127-> - - - - - - - - * - - - | - - - - - - * @ - - - - | |8COUNT: 119|QC
MC76 -> - - - - - - - * - - - - | - - - - @ - * - - - - - | |8COUNT: 122|QD
MC75 -> - - - - - - - - * - - - | - - - - @ - * - - - - - | |8COUNT: 122|QE
MC14 -> - * - - - - - * - - - - | @ - - - - - * - - * - - | |8COUNT: 131|QD
MC13 -> - - * - - - - - * - - - | @ - - - - - * - - * - - | |8COUNT: 131|QE
MC157-> - * - - - - - * - - - - | * - - - - - * - - @ - - | |8COUNT: 132|QB
MC10 -> - - * - - - - - * - - - | @ - - - - - * - - * - - | |8COUNT: 132|QC
MC31 -> - * - - - - - - - - - - | - @ - - - - * - - - - - | |8COUNT: 705|QB
MC30 -> - - * - - - - - - - - - | - @ - - - - * - - - - - | |8COUNT: 705|QC
MC22 -> - * - - - - - - - - - - | - @ - - - - * - - - - - | |8COUNT: 706|QD
MC21 -> - - * - - - - - - - - - | - @ - - - - * - - - - - | |8COUNT: 706|QE
MC168-> * - - - - - - - - - - - | - - - - - - * - * - @ - | |7474: 756|1Q
```

D: \ELI\SPBUF.RPT

MACROCELL INTERCONNECTION CROSS REFERENCE

Logic Array Block "H":

```
        M M M M M M M M M M M M M M M M
        C C C C C C C C C C C C C C C C
        1 1 1 1 1 1 1 1 1 1 1 1 1 1 1 1
        1 1 1 1 2 2 2 2 2 2 2 2 2 1 1 1
        3 4 5 6 8 7 6 5 4 3 2 1 0 9 8 7 | A B C D E F G H I J K L | Name
MC113-> - - - - - - - - - - - - - - - - | - - - - - - - @ - - - - | LWADR7
MC114-> - - - - - - - - - - - - - - - - | - - - - - - - @ - - - - | LWADR8
MC115-> - - - - - - - - - - - - - - - - | - - - - - - - @ - - - - | VADR7
MC116-> - - - - - - - - - - - - - - - - | - - - - - - - @ - - - - | VADR8
MC128-> - - - - - - - - - - - - - - - - | - - * - * - - @ - - - - | WCRY1
MC127-> - - - - * * * * * * - - - - - - | - - - - - - * @ - - - - | |8COUNT: 119 |QC
MC126-> - - - - * - * * * * - - - - - - | - - - * - - - @ - - - - | |8COUNT: 119 |QD
MC125-> - - - - * - - * * * - - - - - - | - - * - - - - @ - - - - | |8COUNT: 119 |QE
MC124-> - - * - * - - - * * - - - - - - | - - - - - - - @ - - - - | |8COUNT: 119 |QF
MC123-> - - - * * - - - - * - - - - - - | - - - - - - - @ - - - - | |8COUNT: 119 |QG
MC122-> - - - - - - - - - - * * * - - - | - - - - - * - @ - - - - | |74161: 40 |QA
MC121-> - - - - - - - - - - - * * - - - | - - - - - * - @ - - - - | |74161: 40 |QB
MC120-> - - - - - - - - - - * * * * * * | - - - * - * - @ - - - - | |74161: 40 |QC
MC119-> - * - * - - - - - - - - - * * * | - - * - - - - @ - - - - | |74161: 462 |QB
MC118-> * - * - - - - - - - - - - - * * | - - - - - - - @ - - - - | |74161: 462 |QC
MC117-> - * - * - - - - - - - - - - - * | - - - - - - - @ - - - - | |74161: 462 |QD

@84   -> * * * * - - - - - - - - - - - - | - - * * * * * * * - * * | ATE
@1    -> - - - - - - - - - - - - - - - - | - - - - - - * - * - - * | CLK1
@83   -> - - - - - - - - - - - - - - - - | * - * * - - - - - * - - | LD_PAR1
@44   -> - - - - - - - - - - * * * * * * | * - * * * * - * - * - - | MB_1
@43   -> - - - - * * * * * * * * * * * * | * * - * - - - * - - - - | MB_4
@42   -> * * * * - - - - - - - - - - - - | - * * * -   - * * * - * | MB_5
@41   -> - - - - - - - - - - - - - - - - | * - * - - - * - - * - * | MB_6
@2    -> - - - - - - - - - - - - - - - - | - - - * - - * - * - - * | RST1
MC192-> - - - - - * * * * * * * * * * * | * * * * * * * * * * * @ | INIT
MC143-> - - - - - * * * * * * * * * * * | * * * * * - - * @ * * * | |SPSEQ1: 769 |-26-
MC141-> * * * * - - - - - - - - - - - - | - - * * * - * * @ * - * | |SPSEQ1: 769 |-31-
MC180-> * * * * - - - - - - - - - - - - | - - * * * * * * * * - @ | TRG
MC62  -> - - - - * * * * * * * * * * * * | - - - @ - - - * - - - - | WCRY0
MC80  -> - - - - - * * * * * * * * * * * | - - - * @ - - * - - - - | WCRY2
MC61  -> - - - - * * * * * * - - - - - - | - - - @ * - - * - - - - | |8COUNT: 119 |QA
MC60  -> - - - - * * * * * * - - - - - - | - - - @ - - * * - - - - | |8COUNT: 119 |QB
MC8   -> * - * - - - - - - - - - - - - - | @ - - - - - - * - * - - | |8COUNT: 132 |QF
MC7   -> - * - * - - - - - - - - - - - - | @ - - - - - - * - * - - | |8COUNT: 132 |QG
MC27  -> * - - - - - - - - - - - - - - - | - @ - - - - - * - - - - | |8COUNT: 705 |QF
MC26  -> - * - - - - - - - - - - - - - - | - @ - - - - - * - - - - | |8COUNT: 705 |QG
MC153-> * * * * - - - - - - - - - - - - | - - * * - * - * - @ - - | |7476: 513 |1Q
MC55  -> * - * - - - - - - - - - - * * * | - - - @ - - - * - - - - | |74161: 462 |QA
MC152-> * * * * - - - - - - - - - - - - | - - * * - - - * - @ - - | |74161: 473 |QA
MC151-> * * * * - - - - - - - - - - - - | - - * - - - - * - @ - - | |74161: 473 |QB
MC150-> * * * * - - - - - - - - - - - - | - - - - - - - * - @ - - | |74161: 473 |QC
MC149-> - * - * - - - - - - - - - - - - | - - - - - - - * - @ - - | |74161: 473 |QD
MC4   -> - - - - - - - - * - - - - - - - | @ * - - - - - * - - - - | |74273: 692 |: 12
MC3   -> - - - - - - - * - - - - - - - - | @ * - - - - - * - - - - | |74273: 692 |: 13
MC148-> - - - - - - * - - - - - - - - - | - * - - - - - * - @ - - | |74273: 692 |: 14
MC2   -> - - - - - * - - - - - - - - - - | @ * - - - - - * - - - - | |74273: 692 |: 15
MC40  -> - - - - - - - - - * - - - - - - | * * @ - - - - * - - - - | |74273: 693 |: 19
```

D: \ELI\SPBUF.RPT

MACROCELL INTERCONNECTION CROSS REFERENCE

Logic Array Block "I":

```
        M M M M M M M M M M M M M M
        C C C C C C C C C C C C C C
```

```
          1 1 1 1 1 1 1 1 1 1 1 1 1 1
          2 4 4 4 4 3 3 4 3 3 3 3 3 3
          9 4 3 2 1 1 2 0 9 8 7 6 5 4 | A B C D E F G H I J K L | Name
MC129-> * * * * * - * - - - - - - - | - - - - - - - - @ - - * | CAS_
MC144-> - - - - - - - - - - - - - - | - - - - - * - - @ - - - |  |SPSEQ1: 769|REFOFF
MC143-> * * * * * - * - - - - - - - | * * * * * - - * @ * * * |  |SPSEQ1: 769|-26-
MC142-> * * * * * - * - - - - - - - | - - - - - * - - @ - - * |  |SPSEQ1: 769|-29-
MC141-> ' - * * * - * - - - - - - - | - - * * * - * * @ * - * |  |SPSEQ1: 769|-31-
MC131-> - - - - - - - - - - - - - - | - - - - - - - - @ - - - | V_EMPTY
MC132-> * - * * * - * - - - - - - - | - - * - - - - - @ - - * | WEN
MC140-> - - - - * * - * * * * - - - | - - - - - - - - @ - - * |  |8COUNT: 231|QB
MC139-> - - - * * * - - * * * - - - | - - - - - - - - @ - - * |  |8COUNT: 231|QC
MC138-> - - - - * * - - - * * - - - | - - - - - - - - @ - - * |  |8COUNT: 231|QD
MC137-> - - - * * * - - - - * - - - | - - - - - - - - @ - - * |  |8COUNT: 231|QE
MC136-> - - - * * - - * * * * * - - | * - - - - - - - @ - - * |  |7474: 233|2Q
MC135-> - - - * * - - - - - - - - - | - - - - - - - - @ - - * |  |7474: 398|2Q
MC134-> - - * - - - - - - - - - - - | - - - - - - - - @ - - * |  |7474: 509|1Q

@84   -> * - - - - * * - - - - - - - | - - * * * * * * * - * * | ATE
@1    -> * - * * * - * * * * * * * * | - - - - - - * - * - - * | CLK1
@83   -> - - - - - - - - - - - - - - | * - * * - - - - - * - - | LD_PAR1
@48   -> - - - - - - - - - - - - - * | - - - - - - @ - * - - - | LOAD1
@51   -> * - * * * - * - - - - - * - | - - * - - - @ - * - - - | MB_0
@44   -> - - - - - - - - - - - - - - | * - * * * * - * - * - - | MB_1
@43   -> - - - - - - - - - - - - - - | * * - * - - - * - - - - | MB_4
@42   -> - - - * * - - - - - - - - - | - * * * - - - * * * - * | MB_5
@41   -> - - - - - - - - - - - - - - | * - * - - - * - - * - * | MB_6
@2    -> * - * * * - * - - - - - - - | - - - * - - * - * - - * | RST1
MC192-> - - - - - - - * * * * - - - | * * * * * * * * * * * @ | INIT
MC63 -> * - * * * - * - - - - - - - | - - - @ - - - - * - - * |  |PACK: 414|-7-
MC190-> * - * * * - * - - - - - - - | - - - - - * - - * - * @ |  |SPSEQ1: 769|-25-
MC189-> * * * * * - * - - - - - - - | - - - - - - - - * - - @ |  |SPSEQ1: 769|-27-
MC180-> * - * * * - * - - - - - - - | - - * * * * * * * * - @ | TRG
MC188-> - - - - * * - * * * * - - - | - - - - - - - - * - - @ |  |8COUNT: 231|QA
MC59 -> - - - * * - - - - - - - - - | - - - @ - - - - * - - * |  |7474: 217|1Q
MC6  -> - - - * * - - - - - - * - - | @ - - - - - - - * - - * |  |7474: 217|2Q
MC187-> - - - * * - - * * * * - - - | - - - * - - - - * - - @ |  |7474: 233|1Q
MC5  -> - - - - - - - - - - - - * - | @ - - - - - - - * - - - |  |7474: 398|1Q
MC179-> - - - - * - - - - - - - - - | - - - - - - - - * - - @ |  |7474: 439|2Q
MC96 -> - - - * * - - - - - - - - - | - - - - - @ - - * - - * |  |7474: 440|1Q
MC46 -> * - * * * - * - - - - - - - | - - @ - - * - - * - - - |  |7474: 440|2Q
MC168-> * - * * * - * - - - - - * - | - - - - - - * - * - @ - |  |7474: 756|1Q
MC167-> * - * * * - * - - - - - - - | - - - - - - - - * - @ * |  |7476: 636|2Q
```

D: \ELI\SPBUF.RPT

MACROCELL INTERCONNECTION CROSS REFERENCE

Logic Array Block "J":

```
          M M M M M M M M M M M M M M M M
          C C C C C C C C C C C C C C C C
          1 1 1 1 1 1 1 1 1 1 1 1 1 1 1 1
          4 4 4 6 5 5 5 5 5 5 5 5 5 5 4 4
          5 6 7 0 9 8 7 6 5 4 3 2 1 0 9 8 | A B C D E F G H I J K L | Name
MC145-> * * * - - - - - * - * - - - - - | * - - - - * - - - @ - - | ORDER0
MC146-> - * * - - - - - * - * - - - - - | * - - - - * - - - @ - - | ORDER1
MC147-> * * * - - - - - * - * * * * * - | * - - - - * - - - @ - - | ORDER2
MC160-> - - - * * * * * - * - * * * * - | * - - - * - - - - @ - - |  |8COUNT: 131|QA
MC159-> - - - * * * * * - * - * * * * - | * - * - - - - - - @ - - |  |8COUNT: 131|QB
MC158-> - - - * * * * * * * - * * * * - | * - - - * - - - - @ - - |  |8COUNT: 132|QA
MC157-> - - - * * * * * * * - * * * * - | * - - - - - * - - @ - - |  |8COUNT: 132|QB
MC156-> - - - * * * * * * * - * * * * - | * - - * - - - - - @ - - |  |8COUNT: 132|QD
MC155-> - - - - - - - - - - - - - - - - | - - - - - - - - - @ - * |  |7474: 245|1Q
MC154-> - - - - - - - - - - - - - - - - | - - - - - - - - - @ - * |  |7474: 439|1Q
MC153-> - - - - - - - - * - * - - - - - | - - * * - * - * - @ - - |  |7476: 513|1Q
```

```
MC152-> - - - - - - - - - - - * * * * - | - - * * - - - * - @ - - | |74161: 473|QA
MC151-> - - - - - - - - - - - - * * * - | - - * - - - - * - @ - - | |74161: 473|QB
MC150-> - - - - - - - - - - - - - * * - | - - - - - - - * - @ - - | |74161: 473|QC
MC149-> - - - - - - - - - - - - - - * - | - - - - - - - * - @ - - | |74161: 473|QD
MC148-> - - - - - - - * - - - - - - - - | - * - - - - - * - @ - - | |74273: 692|: 14

@84   -> - - - - - - - - - - - - - - - - | - - * * * * * * * - * * | ATE
@1    -> - - - - - - - - - - - - - - - - | - - - - - - * - * - - * | CLK1
@83   -> - - - - - - - - - - - - - - - * | * - * * - - - - - * - - | LD_PAR1
@44   -> * * * - - - - - - * - * * * * - | * - * * * * - * - * - - | MB_1
@43   -> - - - - - - - - - - - - - - - - | * * - * - - - * - - - - | MB_4
@42   -> - - - - - - - - - - - - - - - * | - * * * - - - * * * - * | MB_5
@41   -> - - - - - - - - * - - - - - - - | * - * - - - * - - * - * | MB_6
@2    -> - - - - - - - - - - - - - - - - | - - - * - - * - * - - * | RST1
MC192-> * * * * * * * * * * * * * * * - | * * * * * * * * * * * @ | INIT
MC191-> - - - * * * * * * * - * * * * - | * - * - - - - - - * - @ | NEW_DATA
MC143-> - - - * * * * * * * - * * * * - | * * * * * - - * @ * * * | |SPSEQ1: 769|-26-
MC141-> - - - - - - - - * - - - - - - - | - - * * * - * * @ * - * | |SPSEQ1: 769|-31-
MC180-> - - - - - - - - * * * - - - - - | - - * * * * * * * * - @ | TRG
MC108-> * * * - - - - - - - - * * * * - | * - - - - * @ - - * - - | Y_INC
MC16 -> - - - * * * * * - * - - - - - - | @ - * - - - - - - * - * | Y_REQ
MC48 -> - - - * * * * * * * - * * * * - | * - @ - * - - - - * - - | |4COUNT: 662|QA
MC47 -> - - - * * * * * * * - * * * * - | * - @ - - - - - - * - - | |4COUNT: 662|QB
MC15 -> - - - * * * * * - * - * * * * - | @ - - - * - - - - * - - | |8COUNT: 131|QC
MC14 -> - - - * * * * * - * - * * * * - | @ - - - - - * - - * - - | |8COUNT: 131|QD
MC13 -> - - - * * * * * - * - * * * * - | @ - - - - - * - - * - - | |8COUNT: 131|QE
MC12 -> - - - * * * * * - * - * * * * - | @ - - * - - - - - * - - | |8COUNT: 131|QF
MC11 -> - - - * * * * * - * - * * * * - | @ - * - - - - - - * - - | |8COUNT: 131|QG
MC10 -> - - - * * * * * * * - * * * * - | @ - - - - - * - - * - - | |8COUNT: 132|QC
MC9  -> - - - * * * * * * * - * * * * - | @ - * - - - - - - * - - | |8COUNT: 132|QE
MC8  -> - - - * * * * * * * - * * * * - | @ - - - - - - * - * - - | |8COUNT: 132|QF
MC7  -> - - - * * * * * * * - * * * * - | @ - - - - - - * - * - - | |8COUNT: 132|QG
MC186-> - - - - - - - - * - - - - - - - | - - - - - - - - - * - @ | |7474: 245|2Q
MC54 -> - - - - - - * - - - - - - - - - | - * - @ - - - - - * - - | |74273: 692|: 16
MC53 -> - - - - - * - - - - - - - - - - | - * - @ - - - - - * - - | |74273: 692|: 17
MC42 -> - - - - - - - - * - - - - - - - | - - @ * - - - - - * - - | |74273: 692|: 19
MC70 -> - - - - * - - - - - - - - - - - | - * - - @ - - - - * - - | |74273: 693|: 17
MC69 -> - - - * - - - - - - - - - - - - | - * - - @ - - - - * - - | |74273: 693|: 18
```

D: \ELI\SPBUF.RPT

MACROCELL INTERCONNECTION CROSS REFERENCE

Logic Array Block "K":

```
         M M M M M M M M M M M M M M M M
         C C C C C C C C C C C C C C C C
         1 1 1 1 1 1 1 1 1 1 1 1 1 1 1 1
         6 6 7 7 7 7 7 7 7 6 6 6 6 6 6 6
         1 2 6 5 4 3 2 1 0 9 8 7 6 5 4 3 | A B C D E F G H I J K L | Name
MC161-> - - - - - - - - - - - - - - - - | - - - - - - - - - - @ - | IF_ACK
MC162-> - - - - - - - - - - - - - - - - | - - - - - - - - - - @ - | LW_FLG
MC176-> - - * * * * * * * * * - - - - - | - - - - - - - - - - @ - | |8COUNT: 747|QA
MC175-> - - - * * * * * * * * - - - - - | - - - - - - - - - - @ - | |8COUNT: 747|QB
MC174-> - - - - * * * * * * * - - - - - | - - - - - - - - - - @ - | |8COUNT: 747|QC
MC173-> - - - - - * * * * * * - - - - - | - - - - - - - - - - @ - | |8COUNT: 747|QD
MC172-> - - - - - - * * * * * - - - - - | - - - - - - - - - - @ - | |8COUNT: 747|QE
MC171-> - - - - - - - * * * * - - - - - | - - - - - - - - - - @ - | |8COUNT: 747|QF
MC170-> - - - - - - - - * * * - - - - - | - - - - - - - - - - @ - | |8COUNT: 747|QG
MC169-> - - - - - - - - - * * - - - - - | - - - - - - - - - - @ - | |8COUNT: 747|QH
MC168-> - - - - - - - - - - - - - - - - | - - - - - - * - * - @ - | |7474: 756|1Q
MC167-> * - - - - - - - - - - * - - - - | - - - - - - - - * - @ * | |7476: 636|2Q
MC166-> - * - - - - - - - - - - - - - - | - - - - - - - - - - @ - | |74273: 759|: 16
MC165-> - * - - - - - - - - - - - - - - | - - - - - - - - - - @ - | |74273: 759|: 17
MC164-> - * - - - - - - - - - - - - - - | - - - - - - - - - - @ - | |74273: 759|: 18
MC163-> - * - - - - - - - - - - - - - - | - - - - - - - - - - @ - | |74273: 759|: 19
```

```
@84   -> * * - - - - - - - - - - - - - - | - - * * * * * * * - * * | ATE
@4    -> * - - - - - - - - - - - - - - - | @ - - - - - - - - - * - | BUF_SI
@1    -> - - - - - - - - - - - - - - - - | - - - - - - * - * - - * | CLK1
@6    -> - - * - - - - - - - - - - - - - | @ - - - - - - - - - * - | DSP_0
@7    -> - - - * - - - - - - - - - - - * | @ - - - - - - - - - * - | DSP_1
@8    -> - - - - * - - - - - - - - - - - | @ - - - - - - - - - * - | DSP_2
@9    -> - - - - - * - - - - - - - - * - | @ - - - - - - - - - * - | DSP_3
@10   -> - - - - - - * - - - - - - - - - | @ - - - - - - - - - * - | DSP_4
@11   -> - - - - - - - * - - - - - * - - | @ - - - - - - - - - * - | DSP_5
@31   -> - - - - - - - - * - - - - - - - | - - - - - @ - - - - * - | DSP_6
@32   -> - - - - - - - - - * - - * - - - | - - - - - @ - - - - * - | DSP_7
@83   -> - - - - - - - - - - - - - - - - | * - * * - - - - - * - - | LD_PAR1
@44   -> - - - - - - - - - - - - - - - - | * - * * * * - * - * - - | MB_1
@43   -> - - - - - - - - - - - - - - - - | * * - * - - - * - - - - | MB_4
@42   -> - - - - - - - - - - - - - - - - | - * * * - - - * * * - * | MB_5
@41   -> - - - - - - - - - - - - - - - - | * - * - - - * - - * - * | MB_6
@2    -> - - - - - - - - - - - - - - - - | - - - * - - * - * - - * | RST1
MC192-> - - * * * * * * * * * * - - - - | * * * * * * * * * * * @ | INIT_
MC190-> - - - - - - - - - - - * - - - - | - - - - - * - - * - * @ | |SPSEQ1: 769 |-25-
MC143-> - - * * * * * * * * - * - - - - | * * * * * - - * @ * * * | |SPSEQ1: 769 |-26-
MC110-> - - - - - - - - - - * - * * * * | - - - - - - @ - - - * - | |SPSEQ2: 770 |-18-
MC109-> - - * * * * * * * * - - - - - - | - - - - - - @ - - - * - | |SPSEQ2: 770 |-19-
MC45  -> - * * * * * * * * * - - - - - - | - * @ - * - - - - - * - | |74161: 709 |QA
MC44  -> - * * * * * * * * * - - - - - - | - * @ - - - - - - - * - | |74161: 709 |QB
```

D: \ELI\SPBUF.RPT

MACROCELL INTERCONNECTION CROSS REFERENCE

Logic Array Block "L":

```
         M M M M M M M M M M M M M M
         C C C C C C C C C C C C C C
         1 1 1 1 1 1 1 1 1 1 1 1 1 1
         9 9 9 8 8 8 8 8 8 8 8 8 8 7
         2 1 0 9 0 1 2 3 4 8 7 6 5 9 | A B C D E F G H I J K L | Name
MC192->  - - - - - - - - * * - * - - | * * * * * * * * * * * @ | INIT_
MC191->  - - - - - - - - * - - * - - | * - * - - - - - - * - @ | NEW_DATA
MC190->  - - * * * - - - - - - - - - | - - - - - * - - * - * @ | |SPSEQ1: 769 |-25-
MC189->  * - * * * - - - - - - - - - | - - - - - - - - * - - @ | |SPSEQ1: 769 |-27-
MC180->  - - * * * - - * - - - - - - | - - * * * * * * * * - @ | TRG
MC181->  - - - - - - - - - - - - - - | - - - - - - - - - - - @ | V_FULL
MC182->  - - - - - - - - - - - - - - | - - - - - - - - - - - @ | V_HFULL
MC183->  - - - - - - - - - - - - - - | - - - - - - - - - - - @ | V_ORDY_
MC184->  - - - - - - - - - - - - - - | - - - - - - - - - - - @ | V_SCLK_
MC183->  - - * - * - - * - * - - - - | - - - - - - - - * - - @ | |8COUNT: 231 |QA
MC187->  - - * - * - - - - * * - - - | - - - * - - - - * - - @ | |7474: 233 |1Q
MC186->  - - - - - - - * - - - - * - | - - - - - - - - - * - @ | |7474: 245 |2Q
MC185->  - - - - - - - * * - - - - - | - - - - - - - - - - - @ | |7474: 368 |1Q
MC179->  - - * - * - - - - - - - - - | - - - - - - - - * - - @ | |7474: 439 |2Q

@84   -> - - - - * * * * * - - - - - | - - * * * * * * * - * * | ATE
@1    -> - - * * * - - - - * * * * * | - - - - - - * - * - - * | CLK1
@83   -> - - - - - - - - - - - - - - | * - * * - - - - - * - - | LD_PAR1
@44   -> - - - - - - - - - - - - - - | * - * * * * - * - * - - | MB_1
@43   -> - - - - - - - - - - - - - - | * * - * - - - * - - - - | MB_4
@42   -> - - * - * * * - - - - - - - | - * * * - - - * * * - * | MB_5
@41   -> - * - - - - - * * - - * - - | * - * - - - * - - * - * | MB_6
@2    -> - - * * * - - - - - - - - - | - - - * - - * - * - - * | RST1
@72   -> - * - - - - - * * - - * - - | - - - - - - - - - - @ * | SP_STR
@13   -> - * - - - - - - * - - * - - | - @ - - - - - - - - - * | TST_STR
MC129->  - - * * * - - - - - - - - - | - - - - - - - - @ - - * | CAS_
MC63  -> - - * - - - - - - - - - - - | - - - @ - - - - * - - * | |PACK: 414 |-7-
MC143->  - - * * * - - - * - - * - - | * * * * * - - * @ * * * | |SPSEQ1: 769 |-26-
MC142->  - - * * * - - - - - - - - - | - - - - - * - - @ - - * | |SPSEQ1: 769 |-29-
MC141->  - - * * * - - - - - - - - - | - - * * * - * * @ * - * | |SPSEQ1: 769 |-31-
MC132->  - - * * * - - - - - - - - - | - - * - - - - - @ - - * | WEN
```

```
MC16 -> - - - - - - - - - - - - - * | @ - * - - - - - - * - * | Y_REQ
MC140-> - - * - * - * * - - - - - - | - - - - - - - - @ - - * | |8COUNT: 231 |QB
MC139-> - - * - * * - * - - - - - - | - - - - - - - - @ - - * | |8COUNT: 231 |QC
MC138-> - - * - * - * * - - - - - - | - - - - - - - - @ - - * | |8COUNT: 231 |QD
MC137-> - - * - * * - * - - - - - - | - - - - - - - - @ - - * | |8COUNT: 231 |QE
MC59 -> - - * - * - - - - - * - - - | - - - @ - - - - * - - * | |7474: 217 |1Q
MC6  -> - - * - * - - - - - - - - - | @ - - - - - - - * - - * | |7474: 217 |2Q
MC136-> - - * - * - - - - * - - - - | * - - - - - - - @ - - * | |7474: 233 |2Q
MC155-> - - - - - - - * - - - * - - | - - - - - - - - - @ - * | |7474: 245 |1Q
MC135-> - - * - * - - - - - - - - - | - - - - - - - - @ - - * | |7474: 398 |2Q
MC154-> - - - - - - - * - - - - - * | - - - - - - - - - @ - * | |7474: 439 |1Q
MC96 -> - - * - - - - - - - - - - - | - - - - - @ - - * - - * | |7474: 440 |1Q
MC134-> - - - - * - - - - - - - - - | - - - - - - - - @ - - * | |7474: 509 |1Q
MC94 -> - - - - - - - * - - - - - * | - - - - - @ - - - - - * | |7476: 513 |2Q
MC167-> - - * - - - - - - - - - - - | - - - - - - - - * - @ * | |7476: 636 |2Q
```

D: \ELI\SPBUF.RPT

```
** EQUATIONS **

CLK1      :  INPUT;
RST1      :  INPUT;
MB_0      :  INPUT;
BUF_SI    :  INPUT;
MB_4      :  INPUT;
MB_1      :  INPUT;
LD_PAR2   :  INPUT;
MB_2      :  INPUT;
MB_3      :  INPUT;
MB_5      :  INPUT;
MB_6      :  INPUT;
MB_7      :  INPUT;
LD_PAR1   :  INPUT;
TST_STR   :  INPUT;
SP_STR    :  INPUT;
SP_REQ    :  INPUT;
TST_INC   :  INPUT;
SP_INC    :  INPUT;
EOP       :  INPUT;
REF_ON    :  INPUT;
LOAD1     :  INPUT;
DSP_0     :  INPUT;
DSP_1     :  INPUT;
DSP_2     :  INPUT;
DSP_3     :  INPUT;
DSP_4     :  INPUT;
DSP_5     :  INPUT;
DSP_6     :  INPUT;
DSP_7     :  INPUT;
ATE       :  INPUT;
DSP_RDY   :  INPUT;

%  |74273: 692|: 15  %
 _MC002  = DFF(  MB_4 $  GND,  LD_PAR1,  VCC,  VCC );

%  |74273: 692|: 13  %
 _MC003  = DFF(  MB_6 $  GND,  LD_PAR1,  VCC,  VCC );

%  |74273: 692|: 12  %
 _MC004  = DFF(  MB_7 $  GND,  LD_PAR1,  VCC,  VCC );

%  |7474: 398|1Q  %
 _MC005  = DFF(  VCC $  GND,  BUF_SI,  _EQ001,  VCC );
  _EQ001 =  INIT_ & !_MC143;

%  |7474: 217|2Q  %
 _MC006  = DFF(  _EQ002 $  GND,  _EQ003,  _EQ004,  VCC );
```

```
 _EQ002 =  MB_1 &  _MC007 & _MC008 & _MC009 & _MC010 & _MC011 & _MC012 &
              _MC013 & _MC014 & _MC015 & _MC047 & _MC048 & _MC156 &
              _MC157 & _MC158 & _MC159 & _MC160
        # !MB_1 & !_MC145 & !_MC146 & !_MC147;
 _EQ003 =  _X001 & _X002 & _X003;
 _X001  = EXP(  MB_1 & !_MC143 & !NEW_DATA );
 _X002  = EXP(  INIT_ & MB_1 & !NEW_DATA );
 _X003  = EXP( !MB_1 & !Y_INC );
 _EQ004 =  INIT_ & !_MC136;

%  |8COUNT:132|QG  %
 _MC007  = DFF(  _EQ005 $  _EQ006,  _EQ007,  _EQ008,  _EQ009 );
 _EQ005 =  _MC007 & _MC011 & _MC012 & _MC013 & _MC014 & _MC015 &
              _MC040 & _MC159 & _MC160
        #  INIT_ & _MC007 & _X004
        # !INIT_ & _MC040;
 _X004  = EXP(  _MC008 & _MC009 & _MC010 & _MC047 & _MC048 & _MC156 &
              _MC157 & _MC158 );
 _EQ006 =  INIT_ & !_MC007 & _MC008 & _MC009 & _MC010 & _MC047 & _MC048 &
              _MC156 & _MC157 & _MC158;
 _EQ007 =  _X005 & _X006;
 _X005  = EXP( !_MC143 & !NEW_DATA );
 _X006  = EXP(  INIT_ & !NEW_DATA );
 _EQ008 =  _X007;
 _X007  = EXP( !_MC040 & !Y_REQ );
 _EQ009 =  _X008;
 _X008  = EXP(  _MC040 & !Y_REQ );

%  |8COUNT:132|QF  %
 _MC008  = DFF(  _EQ010 $  _EQ011,  _EQ012,  _EQ013,  _EQ014 );
 _EQ010 =  _MC004 & _MC007 & _MC008 & _MC011 & _MC012 & _MC013 &
              _MC014 & _MC015 & _MC159 & _MC160
        #  INIT_ & _MC008 & _X009
        # !INIT_ & _MC004;
 _X009  = EXP(  _MC009 & _MC010 & _MC047 & _MC048 & _MC156 & _MC157 &
              _MC158 );
 _EQ011 =  INIT_ & !_MC008 & _MC009 & _MC010 & _MC047 & _MC048 & _MC156 &
              _MC157 & _MC158;
 _EQ012 =  _X005 & _X006;
 _EQ013 =  _X010;
 _X010  = EXP( !_MC004 & !Y_REQ );
 _EQ014 =  _X011;
 _X011  = EXP(  _MC004 & !Y_REQ );

%  |8COUNT:132|QE  %
 _MC009  = DFF(  _EQ015 $  _EQ016,  _EQ017,  _EQ018,  _EQ019 );
 _EQ015 =  _MC003 & _MC007 & _MC008 & _MC009 & _MC011 & _MC012 &
              _MC013 & _MC014 & _MC015 & _MC159 & _MC160
        #  INIT_ & _MC009 & _X012
        # !INIT_ & _MC003;
 _X012  = EXP(  _MC010 & _MC047 & _MC048 & _MC156 & _MC157 & _MC158 );
 _EQ016 =  INIT_ & !_MC009 & _MC010 & _MC047 & _MC048 & _MC156 & _MC157 &
              _MC158;
 _EQ017 =  _X005 & _X006;
 _EQ018 =  _X013;
 _X013  = EXP( !_MC003 & !Y_REQ );
 _EQ019 =  _X014;
 _X014  = EXP(  _MC003 & !Y_REQ );

%  |8COUNT:132|QC  %
 _MC010  = DFF(  _EQ020 $  _EQ021,  _EQ022,  _EQ023,  _EQ024 );
 _EQ020 =  _MC002 & _MC007 & _MC008 & _MC009 & _MC010 & _MC011 &
              _MC012 & _MC013 & _MC014 & _MC015 & _MC156 & _MC159 &
              _MC160
        #  INIT_ & _MC010 & _X015
        # !INIT_ & _MC002;
```

```
_X015  = EXP(  _MC047 &  _MC048 &  _MC157 &  _MC158 );
_EQ021 =  INIT_ & !_MC010 &  _MC047 &  _MC048 &  _MC157 &  _MC158;
_EQ022 =  _X005 &  _X006;
_EQ023 =  _X016;
_X016  = EXP( !_MC002 & !Y_REQ );
_EQ024 =  _X017;
_X017  = EXP(  _MC002 & !Y_REQ );

% |8COUNT:131|QG %
_MC011  = DFF(  _EQ025 $  VCC,  _EQ026,  _EQ027,  _EQ028 );
_EQ025 =  _MC007 &  _MC008 &  _MC009 &  _MC010 &  _MC011 &  _MC012 &
           _MC013 &  _MC014 &  _MC015 &  _MC047 &  _MC048 & !_MC072 &
           _MC156 &  _MC157 &  _MC158 &  _MC159 &  _MC160
       #  INIT_ & !_MC011 &  _X018
       # !INIT_ & !_MC072;
_X018  = EXP(  _MC007 &  _MC008 &  _MC009 &  _MC010 &  _MC012 &  _MC013 &
           _MC014 &  _MC015 &  _MC047 &  _MC048 &  _MC156 &  _MC157 &
           _MC158 &  _MC159 &  _MC160 );
_EQ026 =  _X005 &  _X006;
_EQ027 =  _X019;
_X019  = EXP( !_MC072 & !Y_REQ );
_EQ028 =  _X020;
_X020  = EXP(  _MC072 & !Y_REQ );

% |8COUNT:131|QF %
_MC012  = DFF(  _EQ029 $  _EQ030,  _EQ031,  _EQ032,  _EQ033 );
_EQ029 =  _MC011 &  _MC012 &  _MC041
       #  INIT_ &  _MC012 &  _X021
       # !INIT_ &  _MC041;
_X021  = EXP(  _MC007 &  _MC008 &  _MC009 &  _MC010 &  _MC013 &  _MC014 &
           _MC015 &  _MC047 &  _MC048 &  _MC156 &  _MC157 &  _MC158 &
           _MC159 &  _MC160 );
_EQ030 =  INIT_ &  _MC007 &  _MC008 &  _MC009 &  _MC010 & !_MC012 &  _MC013 &
           _MC014 &  _MC015 &  _MC047 &  _MC048 &  _MC156 &  _MC157 &
           _MC158 &  _MC159 &  _MC160;
_EQ031 =  _X005 &  _X006;
_EQ032 =  _X022;
_X022  = EXP( !_MC041 & !Y_REQ );
_EQ033 =  _X023;
_X023  = EXP(  _MC041 & !Y_REQ );

% |8COUNT:131|QE %
_MC013  = DFF(  _EQ034 $  _EQ035,  _EQ036,  _EQ037,  _EQ038 );
_EQ034 =  _MC011 &  _MC012 &  _MC013 &  _MC019
       #  INIT_ &  _MC013 &  _X024
       # !INIT_ &  _MC019;
_X024  = EXP(  _MC007 &  _MC008 &  _MC009 &  _MC010 &  _MC014 &  _MC015 &
           _MC047 &  _MC048 &  _MC156 &  _MC157 &  _MC158 &  _MC159 &
           _MC160 );
_EQ035 =  INIT_ &  _MC007 &  _MC008 &  _MC009 &  _MC010 & !_MC013 &  _MC014 &
           _MC015 &  _MC047 &  _MC048 &  _MC156 &  _MC157 &  _MC158 &
           _MC159 &  _MC160;
_EQ036 =  _X005 &  _X006;
_EQ037 =  _X025;
_X025  = EXP( !_MC019 & !Y_REQ );
_EQ038 =  _X026;
_X026  = EXP(  _MC019 & !Y_REQ );

% |8COUNT:131|QD %
_MC014  = DFF(  _EQ039 $  _EQ040,  _EQ041,  _EQ042,  _EQ043 );
_EQ039 =  _MC011 &  _MC012 &  _MC013 &  _MC014 &  _MC020
       #  INIT_ &  _MC014 &  _X027
       # !INIT_ &  _MC020;
_X027  = EXP(  _MC007 &  _MC008 &  _MC009 &  _MC010 &  _MC015 &  _MC047 &
```

```
             _MC048 &  _MC156 &  _MC157 &  _MC158 &  _MC159 &  _MC160 );
 _EQ040 =  INIT_ &  _MC007 &  _MC008 &  _MC009 &  _MC010 & !_MC014 &  _MC015 &
             _MC047 &  _MC048 &  _MC156 &  _MC157 &  _MC158 &  _MC159 &
             _MC160;
 _EQ041 =  _X005 &  _X006;
 _EQ042 =  _X028;
 _X028  = EXP( !_MC020 & !Y_REQ );
 _EQ043 =  _X029;
 _X029  = EXP(  _MC020 & !Y_REQ );

% |8COUNT:131|QC %
 _MC015 = DFF(  _EQ044 $  _EQ045,  _EQ046,  _EQ047,  _EQ048 );
 _EQ044 =  _MC011 &  _MC012 &  _MC013 &  _MC014 &  _MC015 &  _MC071
        #  INIT_ &  _MC015 &  _X030
        # !INIT_ &  _MC071;
 _X030  = EXP(  _MC007 &  _MC008 &  _MC009 &  _MC010 &  _MC047 &  _MC048 &
             _MC156 &  _MC157 &  _MC158 &  _MC159 &  _MC160 );
 _EQ045 =  INIT_ &  _MC007 &  _MC008 &  _MC009 &  _MC010 & !_MC015 &  _MC047 &
             _MC048 &  _MC156 &  _MC157 &  _MC158 &  _MC159 &  _MC160;
 _EQ046 =  _X005 &  _X006;
 _EQ047 =  _X031;
 _X031  = EXP( !_MC071 & !Y_REQ );
 _EQ048 =  _X032;
 _X032  = EXP(  _MC071 & !Y_REQ );

% Y_REQ %
 Y_REQ  = MCELL(  _EQ049 $  VCC );
 _EQ049 =  MB_6 &  MB_7
        # !MB_6 &  SP_REQ;

% |8COUNT:706|QG %
 _MC017 = DFF(  _EQ050 $  VCC,  _MC143,  VCC,  VCC );
 _EQ050 =  _MC017 &  _MC018 &  _MC021 &  _MC022 &  _MC023 &  _MC024 &
             _MC025 &  _MC026 &  _MC027 &  _MC028 &  _MC029 &  _MC030 &
             _MC031 &  _MC032 &  _MC044 &  _MC045 & !_MC072
        #  INIT_ & !_MC017 &  _X033
        # !INIT_ & !_MC072;
 _X033  = EXP(  _MC018 &  _MC021 &  _MC022 &  _MC023 &  _MC024 &  _MC025 &
             _MC026 &  _MC027 &  _MC028 &  _MC029 &  _MC030 &  _MC031 &
             _MC032 &  _MC044 &  _MC045 );

% |8COUNT:706|QF %
 _MC018 = DFF(  _EQ051 $  _EQ052,  _MC143,  VCC,  VCC );
 _EQ051 =  _MC017 &  _MC018 &  _MC041
        #  INIT_ &  _MC018 &  _X034
        # !INIT_ &  _MC041;
 _X034  = EXP(  _MC021 &  _MC022 &  _MC023 &  _MC024 &  _MC025 &  _MC026 &
             _MC027 &  _MC028 &  _MC029 &  _MC030 &  _MC031 &  _MC032 &
             _MC044 &  _MC045 );
 _EQ052 =  INIT_ & !_MC018 &  _MC021 &  _MC022 &  _MC023 &  _MC024 &  _MC025 &
             _MC026 &  _MC027 &  _MC028 &  _MC029 &  _MC030 &  _MC031 &
             _MC032 &  _MC044 &  _MC045;

% |74273:693|:14 %
 _MC019 = DFF(  MB_5 $  GND,  LD_PAR2,  VCC,  VCC );

% |74273:693|:15 %
 _MC020 = DFF(  MB_4 $  GND,  LD_PAR2,  VCC,  VCC );

% |8COUNT:706|QE %

 _MC021 = DFF(  _EQ053 $  _EQ054,  _MC143,  VCC,  VCC );
 _EQ053 =  _MC017 &  _MC018 &  _MC019 &  _MC021
        #  INIT_ &  _MC021 &  _X035
        # !INIT_ &  _MC019;
```

```
 _X035  = EXP(  _MC022 &  _MC023 &  _MC024 &  _MC025 &  _MC026 &  _MC027 &
            _MC028 &  _MC029 &  _MC030 &  _MC031 &  _MC032 &  _MC044 &
            _MC045 );
 _EQ054 =  INIT_ & !_MC021 &  _MC022 &  _MC023 &  _MC024 &  _MC025 &  _MC026 &
            _MC027 &  _MC028 &  _MC029 &  _MC030 &  _MC031 &  _MC032 &
            _MC044 &  _MC045;

% |8COUNT:706|QD %
_MC022  = DFF( _EQ055 $  _EQ056,  _MC143,  VCC,  VCC );
 _EQ055 =  _MC017 &  _MC018 &  _MC020 &  _MC021 &  _MC022
        #  INIT_ &  _MC022 &  _X036
        # !INIT_ &  _MC020;
 _X036  = EXP(  _MC023 &  _MC024 &  _MC025 &  _MC026 &  _MC027 &  _MC028 &
            _MC029 &  _MC030 &  _MC031 &  _MC032 &  _MC044 &  _MC045 );
 _EQ056 =  INIT_ & !_MC022 &  _MC023 &  _MC024 &  _MC025 &  _MC026 &  _MC027 &
            _MC028 &  _MC029 &  _MC030 &  _MC031 &  _MC032 &  _MC044 &
            _MC045;

% |8COUNT:706|QC %
_MC023  = DFF( _EQ057 $  _EQ058,  _MC143,  VCC,  VCC );
 _EQ057 =  _MC017 &  _MC018 &  _MC021 &  _MC022 &  _MC023 &  _MC071
        #  INIT_ &  _MC023 &  _X037
        # !INIT_ &  _MC071;
 _X037  = EXP(  _MC024 &  _MC025 &  _MC026 &  _MC027 &  _MC028 &  _MC029 &
            _MC030 &  _MC031 &  _MC032 &  _MC044 &  _MC045 );
 _EQ058 =  INIT_ & !_MC023 &  _MC024 &  _MC025 &  _MC026 &  _MC027 &  _MC028 &
            _MC029 &  _MC030 &  _MC031 &  _MC032 &  _MC044 &  _MC045;

% |8COUNT:706|QB %
_MC024  = DFF( _EQ059 $  _EQ060,  _MC143,  VCC,  VCC );
 _EQ059 =  _MC017 &  _MC018 &  _MC021 &  _MC022 &  _MC023 &  _MC024 &
            _MC070
        #  INIT_ &  _MC024 &  _X038
        # !INIT_ &  _MC070;
 _X038  = EXP(  _MC025 &  _MC026 &  _MC027 &  _MC028 &  _MC029 &  _MC030 &
            _MC031 &  _MC032 &  _MC044 &  _MC045 );
 _EQ060 =  INIT_ & !_MC024 &  _MC025 &  _MC026 &  _MC027 &  _MC028 &  _MC029 &
            _MC030 &  _MC031 &  _MC032 &  _MC044 &  _MC045;

% |8COUNT:706|QA %
_MC025  = DFF( _EQ061 $  _EQ062,  _MC143,  VCC,  VCC );
 _EQ061 =  _MC017 &  _MC018 &  _MC021 &  _MC022 &  _MC023 &  _MC024 &
            _MC025 &  _MC069
        #  INIT_ &  _MC025 &  _X039
        # !INIT_ &  _MC069;
 _X039  = EXP(  _MC026 &  _MC027 &  _MC028 &  _MC029 &  _MC030 &  _MC031 &
            _MC032 &  _MC044 &  _MC045 );
 _EQ062 =  INIT_ & !_MC025 &  _MC026 &  _MC027 &  _MC028 &  _MC029 &  _MC030 &
            _MC031 &  _MC032 &  _MC044 &  _MC045;

% |8COUNT:705|QG %
_MC026  = DFF( _EQ063 $  _EQ064,  _MC143,  VCC,  VCC );
 _EQ063 =  _MC017 &  _MC018 &  _MC021 &  _MC022 &  _MC023 &  _MC024 &
            _MC025 &  _MC026 &  _MC040
        #  INIT_ &  _MC026 &  _X040
        # !INIT_ &  _MC040;
 _X040  = EXP(  _MC027 &  _MC028 &  _MC029 &  _MC030 &  _MC031 &  _MC032 &
            _MC044 &  _MC045 );
 _EQ064 =  INIT_ & !_MC026 &  _MC027 &  _MC028 &  _MC029 &  _MC030 &  _MC031 &
            _MC032 &  _MC044 &  _MC045;

% |8COUNT:705|QF %
_MC027  = DFF( _EQ065 $  _EQ066,  _MC143,  VCC,  VCC );
 _EQ065 =  _MC004 &  _MC017 &  _MC018 &  _MC021 &  _MC022 &  _MC023 &
            _MC024 &  _MC025 &  _MC026 &  _MC027
```

```
        # INIT_ & _MC027 & _X041
        # !INIT_ & _MC004;
  _X041  = EXP( _MC028 & _MC029 & _MC030 & _MC031 & _MC032 & _MC044 &
             _MC045 );
  _EQ066 =  INIT_ & !_MC027 & _MC028 & _MC029 & _MC030 & _MC031 & _MC032 &
             _MC044 & _MC045;

% |8COUNT:705|QE %
 _MC028  = DFF( _EQ067 $ _EQ068, _MC143, VCC, VCC );
  _EQ067 =  _MC003 & _MC017 & _MC018 & _MC021 & _MC022 & _MC023 &
             _MC024 & _MC025 & _MC026 & _MC027 & _MC028
        # INIT_ & _MC028 & _X042
        # !INIT_ & _MC003;
  _X042  = EXP( _MC029 & _MC030 & _MC031 & _MC032 & _MC044 & _MC045 );
  _EQ068 =  INIT_ & !_MC028 & _MC029 & _MC030 & _MC031 & _MC032 & _MC044 &
             _MC045;

% |8COUNT:705|QD %
 _MC029  = DFF( _EQ069 $ _EQ070, _MC143, VCC, VCC );
  _EQ069 =  _MC017 & _MC018 & _MC021 & _MC022 & _MC023 & _MC024 &
             _MC025 & _MC026 & _MC027 & _MC028 & _MC029 & _MC148
        # INIT_ & _MC029 & _X043
        # !INIT_ & _MC148;
  _X043  = EXP( _MC030 & _MC031 & _MC032 & _MC044 & _MC045 );
  _EQ070 =  INIT_ & !_MC029 & _MC030 & _MC031 & _MC032 & _MC044 & _MC045;

% |8COUNT:705|QC %
 _MC030  = DFF( _EQ071 $ _EQ072, _MC143, VCC, VCC );
  _EQ071 =  _MC002 & _MC017 & _MC018 & _MC021 & _MC022 & _MC023 &
             _MC024 & _MC025 & _MC026 & _MC027 & _MC028 & _MC029 &
             _MC030
        # INIT_ & _MC030 & _X044
        # !INIT_ & _MC002;
  _X044  = EXP( _MC031 & _MC032 & _MC044 & _MC045 );
  _EQ072 =  INIT_ & !_MC030 & _MC031 & _MC032 & _MC044 & _MC045;

% |8COUNT:705|QB %
 _MC031  = DFF( _EQ073 $ _EQ074, _MC143, VCC, VCC );
  _EQ073 =  _MC017 & _MC018 & _MC021 & _MC022 & _MC023 & _MC024 &
             _MC025 & _MC026 & _MC027 & _MC028 & _MC029 & _MC030 &
             _MC031 & _MC054
        # INIT_ & _MC031 & _X045
        # !INIT_ & _MC054;
  _X045  = EXP( _MC032 & _MC044 & _MC045 );
  _EQ074 =  INIT_ & !_MC031 & _MC032 & _MC044 & _MC045;

% |8COUNT:705|QA %
 _MC032  = DFF( _EQ075 $ _EQ076, _MC143, VCC, VCC );
  _EQ075 =  _MC017 & _MC018 & _MC021 & _MC022 & _MC023 & _MC024 &
             _MC025 & _MC026 & _MC027 & _MC028 & _MC029 & _MC030 &
             _MC031 & _MC032 & _MC053
        # INIT_ & _MC032 & _X046
        # !INIT_ & _MC053;
  _X046  = EXP( _MC044 & _MC045 );
  _EQ076 =  INIT_ & !_MC032 & _MC044 & _MC045;

LWADR1   = TRI( _MC033, !ATE);
 _MC033  = MCELL( _EQ077 $ _EQ078 );
  _EQ077 =  _MC024 & _MC141 & _MC180
        #  _MC141 & _MC159 & !_MC180
        #  _MC047 & !_MC141 & !_MC180;
  _EQ078 =  _MC044 & !_MC141 & _MC180;

LWADR6   = TRI( _MC034, !ATE);
 _MC034  = MCELL( _EQ079 $ VCC );
```

```
_EQ079 = _X047 & _X048 & _X049 & _X050 & _X051 & _X052 & _X053 &
          _X054;
  _X047  = EXP( MB_5 & _MC141 & _MC151 & !_MC152 & !_MC180 );
  _X048  = EXP( MB_5 & _MC141 & !_MC151 & _MC152 & _MC153 & !_MC180 );
  _X049  = EXP( MB_5 & _MC141 & _MC151 & !_MC153 & !_MC180 );
  _X050  = EXP( MB_5 & _MC119 & _MC141 & _MC180 );
  _X051  = EXP( !MB_5 & _MC011 & _MC141 & !_MC180 );
  _X052  = EXP( _MC009 & !_MC141 & !_MC180 );
  _X053  = EXP( !MB_5 & _MC017 & _MC141 & _MC180 );
  _X054  = EXP( _MC028 & !_MC141 & _MC180 );

VADR1    = TRI( _MC035, !ATE);
 _MC035  = MCELL( _EQ080 $ _EQ081 );
 _EQ080 = _MC078 & _MC141 & _MC180
        # _MC141 & _MC159 & !_MC180
        # _MC047 & !_MC141 & !_MC180;
 _EQ081 = _MC056 & !_MC141 & _MC180;

VADR6    = TRI( _MC036, !ATE);
 _MC036  = MCELL( _EQ082 $ VCC );
 _EQ082 = _X047 & _X048 & _X049 & _X050 & _X051 & _X052 & _X055 &
          _X056;
  _X055  = EXP( !MB_5 & _MC073 & _MC141 & _MC180 );
  _X056  = EXP( _MC125 & !_MC141 & _MC180 );

% |74273:693|:19 %
 _MC040  = DFF( MB_0 $ GND, LD_PAR2, VCC, VCC );

% |74273:693|:13 %
 _MC041  = DFF( MB_6 $ GND, LD_PAR2, VCC, VCC );

% |74273:692|:19 %
 _MC042  = DFF( MB_0 $ GND, LD_PAR1, VCC, VCC );

% |74273:692|:18 %
 _MC043  = DFF( MB_1 $ GND, LD_PAR1, VCC, VCC );

% |74161:709|QB %
 _MC044  = DFF( _EQ083 $ _MC043, _MC143, VCC, VCC );
 _EQ083 = INIT_ & !_MC043 & _MC044 & !_MC045
        # INIT_ & !_MC043 & !_MC044 & _MC045
        # INIT_ & _MC043 & !_MC044 & !_MC045;

% |74161:709|QA %
 _MC045  = DFF( _EQ084 $ _MC042, _MC143, VCC, VCC );
 _EQ084 = INIT_ & _MC042 & !_MC044 & _MC045

        # INIT_ & !_MC042 & !_MC045;

% |7474:440|2Q %
 _MC046  = DFF( WCRY1 $ GND, _MC143, _EQ085, VCC );
 _EQ085 = _X057;
  _X057  = EXP( _MC132 & _MC141 & _MC180 );

% |4COUNT:662|QB %
 _MC047  = DFF( _EQ086 $ _MC043, _EQ087, _EQ088, _EQ089 );
 _EQ086 = INIT_ & !_MC043 & _MC047 & !_MC048
        # INIT_ & !_MC043 & !_MC047 & _MC048
        # INIT_ & _MC043 & !_MC047 & !_MC048;
 _EQ087 = _X005 & _X006;
 _EQ088 = _X058;
  _X058  = EXP( !_MC043 & !Y_REQ );
 _EQ089 = _X059;
  _X059  = EXP( _MC043 & !Y_REQ );
```

```
% |4COUNT:662|QA %
 _MC048  = DFF( _EQ090 $ _MC042, _EQ091, _EQ092, _EQ093 );
  _EQ090 =  INIT_ & _MC042 & !_MC047 & _MC048
          # INIT_ & !_MC042 & !_MC048;
  _EQ091 =  _X005 & _X006;
  _EQ092 =  _X060;
  _X060  = EXP( !_MC042 & !Y_REQ );
  _EQ093 =  _X061;
  _X061  = EXP( _MC042 & !Y_REQ );

LOWER_   = TRI( _MC049, !ATE);
 _MC049  = DFF( !_MC051 $ VCC, !_MC143, _EQ094, VCC );
  _EQ094 =  INIT_ & !_MC063;

LWADR5   = TRI( _MC050, !ATE);
 _MC050  = MCELL( _EQ095 $ VCC );
  _EQ095 =  _X062 & _X063 & _X064 & _X065 & _X066 & _X067 & _X068;
  _X062  = EXP( MB_5 & _MC141 & !_MC152 & _MC153 & !_MC180 );
  _X063  = EXP( MB_5 & _MC141 & _MC152 & !_MC153 & !_MC180 );
  _X064  = EXP( MB_5 & _MC055 & _MC141 & _MC180 );
  _X065  = EXP( !MB_5 & _MC012 & _MC141 & !_MC180 );
  _X066  = EXP( !_MC141 & _MC156 & !_MC180 );
  _X067  = EXP( !MB_5 & _MC018 & _MC141 & _MC180 );
  _X068  = EXP( _MC029 & !_MC141 & _MC180 );

UPPER_   = TRI( _MC051, !ATE);
 _MC051  = DFF( _MC051 $ VCC, !_MC143, VCC, _EQ094 );

VADR5    = TRI( _MC052, !ATE);
 _MC052  = MCELL( _EQ096 $ VCC );
  _EQ096 =  _X062 & _X063 & _X064 & _X065 & _X066 & _X069 & _X070;
  _X069  = EXP( !MB_5 & _MC074 & _MC141 & _MC180 );
  _X070  = EXP( _MC126 & !_MC141 & _MC180 );

% |74273:692|:17 %
 _MC053  = DFF( MB_2 $ GND, LD_PAR1, VCC, VCC );

% |74273:692|:16 %
 _MC054  = DFF( MB_3 $ GND, LD_PAR1, VCC, VCC );

% |74161:462|QA %
 _MC055  = DFF( _EQ097 $ !_MC055, _MC143, INIT_, VCC );
  _EQ097 =  MB_4 & !WCRY0
          # !MB_1 & !_MC120
          # !MB_4 & !WCRY2;

% |74161:46|QB %
 _MC056  = DFF( _EQ098 $ _EQ099, _MC143, VCC, VCC );
  _EQ098 =  INIT_ & _MC057 & !WCRY0 & _X071
          # _MC043 & _X072;
  _X071  = EXP( MB_4 & !WCRY2 );
  _X072  = EXP( INIT_ & !WCRY0 );
  _EQ099 =  INIT_ & _MC056 & !WCRY0;

% |74161:46|QA %
 _MC057  = DFF( _EQ100 $ !_MC057, _MC143, VCC, VCC );
  _EQ100 =  INIT_ & MB_4 & !WCRY0 & !WCRY2
          # _MC042 & _MC057 & _X072
          # !_MC042 & !_MC057 & _X072;

% |7474:848|1Q %
 _MC058  = DFF( VCC $ GND, EOP, _EQ101, VCC );
  _EQ101 =  INIT_ & !_MC187;
```

```
% |7474:217|1Q %
 _MC059  = DFF( _EQ102 $ VCC, _MC143, _EQ103, !_MC058 );
  _EQ102 =  MB_4 & !WCRY0
        # !MB_1 & !_MC120
        # !MB_4 & !WCRY2;
  _EQ103 =  INIT_ & !_MC187;

% |8COUNT:119|QB %
 _MC060  = DFF( _EQ104 $ _EQ105, _MC143, VCC, VCC );
  _EQ104 =  INIT_ & _MC061 & !WCRY2 & _X073
        #  _MC054 & WCRY2 & _X073
        # !INIT_ & _MC054;
  _X073  = EXP( !MB_4 & !WCRY0 );
  _EQ105 =  INIT_ & _MC060 & !WCRY2;

% |8COUNT:119|QA %
 _MC061  = DFF( _EQ106 $ _EQ107, _MC143, VCC, VCC );
  _EQ106 =  INIT_ & !MB_4 & _MC061 & !WCRY0 & !WCRY2
        #  _MC053 & WCRY2 & _X073
        # !INIT_ & _MC053;
  _EQ107 =  INIT_ & !_MC061 & !WCRY2 & _X073;

% WCRY0 %
 WCRY0   = MCELL( _EQ108 $ GND );
  _EQ108 =  _MC056 & _MC057 & WCRY2
        # !MB_4 & _MC056 & _MC057;

% |PACK:414|-7- %
 _MC063  = DFF( _EQ109 $ _EQ110, _MC143, RST1, VCC );
  _EQ109 =  INIT_ & !MB_2 & MB_3 & MB_4 & _MC053 & !_MC063 & !_MC064 &
              _X074 & _X075 & _X076 & _X077
        #  INIT_ & !MB_2 & MB_3 & _MC042 & _MC053 & !_MC063 & !_MC064 &
              _X074 & _X075 & _X076 & _X077
        # !MB_2 & !MB_3 & !MB_4 & !_MC042 & !_MC063 & !_MC064 & _X074 &
              _X075 & _X076 & _X077;
  _X074  = EXP( INIT_ & !MB_2 & !_MC063 & !_MC064 & !WCRY2 );
  _X075  = EXP( !MB_2 & !MB_3 & !_MC053 & !_MC063 & !_MC064 );
  _X076  = EXP( !MB_2 & !MB_3 & !_MC063 & !_MC064 & !WCRY2 );
  _X077  = EXP( !MB_2 & _MC063 & _MC064 );
  _EQ110 =  _X074 & _X075 & _X076 & _X077;

% |PACK:414|-6- %
 _MC064  = DFF( _EQ111 $ _EQ112, _MC143, RST1, VCC );
  _EQ111 = !INIT_ & MB_3 & !_MC063 & !_MC064
        # !MB_4 & !_MC042 & !_MC063 & !_MC064
        # !_MC063 & !_MC064 & _X078;
  _X078  = EXP( !MB_2 & _MC053 & WCRY2 );
  _EQ112 =  _X077;

LWADR0   = TRI( _MC065, !ATE);
 _MC065  = MCELL( _EQ113 $ _EQ114 );
  _EQ113 =  _MC025 & _MC141 & _MC180
        #  _MC141 & _MC160 & !_MC180
        #  _MC048 & !_MC141 & !_MC180;
  _EQ114 =  _MC045 & !_MC141 & _MC180;

LWADR2   = TRI( _MC066, !ATE);
 _MC066  = MCELL( _EQ115 $ _EQ116 );
  _EQ115 =  _MC023 & _MC141 & _MC180
        #  _MC015 & _MC141 & !_MC180
        # !_MC141 & _MC158 & !_MC180;
  _EQ116 =  _MC032 & !_MC141 & _MC180;

VADR0    = TRI( _MC067, !ATE);
 _MC067  = MCELL( _EQ117 $ _EQ118 );
```

```
  _EQ117 =  _MC079 &  _MC141 &  _MC180
         #  _MC141 &  _MC160 & !_MC180
         #  _MC048 & !_MC141 & !_MC180;
  _EQ118 =  _MC057 & !_MC141 &  _MC180;

 VADR2    = TRI(  _MC068, !ATE);
  _MC068  = MCELL(  _EQ119 $  _EQ120 );
  _EQ119 =  _MC077 &  _MC141 &  _MC180
         #  _MC015 &  _MC141 & !_MC180
         # !_MC141 &  _MC158 & !_MC180;
  _EQ120 =  _MC061 & !_MC141 &  _MC180;

% |74273:693|:18 %
 _MC069  = DFF(  MB_1 $  GND,  LD_PAR2,  VCC,  VCC );

% |74273:693|:17 %
 _MC070  = DFF(  MB_2 $  GND,  LD_PAR2,  VCC,  VCC );

% |74273:693|:16 %
 _MC071  = DFF(  MB_3 $  GND,  LD_PAR2,  VCC,  VCC );

% |74273:693|:12 %
 _MC072  = DFF(  MB_7 $  GND,  LD_PAR2,  VCC,  VCC );

% |8COUNT:122|QG %
 _MC073  = DFF(  _EQ121 $  _EQ122,  _MC143,  VCC,  VCC );
  _EQ121 =  INIT_ &  _MC074 &  _MC075 &  _MC076 &  _MC077 &  _MC078 &  _MC079 &
              WCRY1 & !WCRY2
         #  _MC072 &  WCRY1 &  WCRY2
         # !INIT_ &  _MC072;
  _EQ122 =  INIT_ &  _MC073 & !WCRY2;

% |8COUNT:122|QF %

 _MC074  = DFF(  _EQ123 $  _EQ124,  _MC143,  VCC,  VCC );
  _EQ123 =  INIT_ &  _MC075 &  _MC076 &  _MC077 &  _MC078 &  _MC079 &  WCRY1 &
             !WCRY2
         #  _MC041 &  WCRY1 &  WCRY2
         # !INIT_ &  _MC041;
  _EQ124 =  INIT_ &  _MC074 & !WCRY2;

% |8COUNT:122|QE %
 _MC075  = DFF(  _EQ125 $  _EQ126,  _MC143,  VCC,  VCC );
  _EQ125 =  INIT_ &  _MC076 &  _MC077 &  _MC078 &  _MC079 &  WCRY1 & !WCRY2
         #  _MC019 &  WCRY1 &  WCRY2
         # !INIT_ &  _MC019;
  _EQ126 =  INIT_ &  _MC075 & !WCRY2;

% |8COUNT:122|QD %
 _MC076  = DFF(  _EQ127 $  _EQ128,  _MC143,  VCC,  VCC );
  _EQ127 =  INIT_ &  _MC077 &  _MC078 &  _MC079 &  WCRY1 & !WCRY2
         #  _MC020 &  WCRY1 &  WCRY2
         # !INIT_ &  _MC020;
  _EQ128 =  INIT_ &  _MC076 & !WCRY2;

% |8COUNT:122|QC %
 _MC077  = DFF(  _EQ129 $  _EQ130,  _MC143,  VCC,  VCC );
  _EQ129 =  INIT_ &  _MC078 &  _MC079 &  WCRY1 & !WCRY2
         #  _MC071 &  WCRY1 &  WCRY2
         # !INIT_ &  _MC071;
  _EQ130 =  INIT_ &  _MC077 & !WCRY2;

% |8COUNT:122|QB %
 _MC078  = DFF(  _EQ131 $  _EQ132,  _MC143,  VCC,  VCC );
  _EQ131 =  INIT_ &  _MC079 &  WCRY1 & !WCRY2
         #  MC070 &  WCRY1 &  WCRY2
```

```
        # !INIT_ &  _MC070;
  _EQ132 =  INIT_ &  _MC078 & !WCRY2;

% |8COUNT:122|QA  %
 _MC079  = DFF(  _EQ133 $  _EQ134,  _MC143,  VCC,  VCC );
  _EQ133 =  INIT_ &  WCRY1 & !WCRY2
        #  _MC069 &  WCRY1
        # !INIT_ &  _MC069;
  _EQ134 =  INIT_ &  _MC079 & !WCRY2;

% WCRY2  %
 WCRY2   = MCELL(  _EQ135 $  GND );
  _EQ135 =  _MC073 &  _MC074 &  _MC075 &  _MC076 &  _MC077 &  _MC078 &
              _MC079 &  WCRY1;

% |74273:544|:19  %
 _MC081  = DFF(  _MC122 $  GND, !_MC046,  INIT_,  VCC );

% |74273:544|:18  %
 _MC082  = DFF(  _MC121 $  GND, !_MC046,  INIT_,  VCC );

% |74273:544|:17  %
 _MC083  = DFF(  _MC120 $  GND, !_MC046,  INIT_,  VCC );

RAS0     = TRI(  _MC084, !ATE);
 _MC084  = MCELL(  _EQ136 $  _EQ137 );
  _EQ136 = !_MC081 & !_MC082 & !_MC083 & !_MC142 &  _MC180 &  _X079
        #  _MC093 & !_MC142 &  _MC153 & !_MC180 &  _X079
        # !_MC093 & !_MC142 & !_MC153 & !_MC180 &  _X079;
  _X079  = EXP(  _MC095 & !_MC142 );
  _EQ137 =  _X079;

RAS1     = TRI(  _MC085, !ATE);
 _MC085  = MCELL(  _EQ138 $  _EQ139 );
  _EQ138 =  _MC081 & !_MC082 & !_MC083 & !_MC142 &  _MC180 &  _X079
        #  _MC092 & !_MC142 &  _MC153 & !_MC180 &  _X079
        # !_MC092 & !_MC142 & !_MC153 & !_MC180 &  _X079;
  _EQ139 =  _X079;

RAS2     = TRI(  _MC086, !ATE);
 _MC086  = MCELL(  _EQ140 $  _EQ141 );
  _EQ140 = !_MC081 &  _MC082 & !_MC083 & !_MC142 &  _MC180 &  _X079
        #  _MC091 & !_MC142 &  _MC153 & !_MC180 &  _X079
        # !_MC091 & !_MC142 & !_MC153 & !_MC180 &  _X079;
  _EQ141 =  _X079;

RAS3     = TRI(  _MC087, !ATE);
 _MC087  = MCELL(  _EQ142 $  _EQ143 );
  _EQ142 =  _MC081 &  _MC082 & !_MC083 & !_MC142 &  _MC180 &  _X079
        #  _MC090 & !_MC142 &  _MC153 & !_MC180 &  _X079
        # !_MC090 & !_MC142 & !_MC153 & !_MC180 &  _X079;
  _EQ143 =  _X079;

RAS4     = TRI(  _MC088, !ATE);
 _MC088  = MCELL(  _EQ144 $  _EQ145 );
  _EQ144 = !_MC081 & !_MC082 &  _MC083 & !_MC142 &  _MC180 &  _X079
        #  _MC089 & !_MC142 &  _MC153 & !_MC180 &  _X079
        # !_MC089 & !_MC142 & !_MC153 & !_MC180 &  _X079;
  _EQ145 =  _X079;

% |74164:475|QE  %
 _MC089  = DFF(  _MC090 $  GND,  Y_INC,  _EQ146,  VCC );
  _EQ146 =  INIT_ & !MB_1 &  _X080;
  _X080  = EXP(  _MC089 & !Y_INC );
```

```
% |74164:475|QD %
 _MC090  = DFF(  _MC091 $  GND,  Y_INC,  _EQ147,  VCC );
  _EQ147 =  INIT_ & !MB_1 &  _X080;

% |74164:475|QC %
 _MC091  = DFF(  _MC092 $  GND,  Y_INC,  _EQ148,  VCC );
  _EQ148 =  INIT_ & !MB_1 &  _X080;

% |74164:475|QB %
 _MC092  = DFF(  _MC093 $  GND,  Y_INC,  _EQ149,  VCC );
  _EQ149 =  INIT_ & !MB_1 &  _X080;

% |74164:475|QA %
 _MC093  = DFF(  VCC $  GND,  Y_INC,  _EQ150,  VCC );
  _EQ150 =  INIT_ & !MB_1 &  _X080;

% |7476:513|2Q %
 _MC094  = DFF(  _MC094 $  VCC,  _EQ151,  _EQ152,  VCC );
  _EQ151 = !_MC142 & !_MC180;
  _EQ152 =  INIT_ &  _X081;
  _X081  = EXP( !_MC145 & !_MC146 & !_MC147 );

% |7474:509|2Q %
 _MC095  = DFF(  GND $  GND,  GND, !_MC190,  _MC144 );

% |7474:440|1Q %
 _MC096  = DFF(  GND $  GND,  GND,  _MC144,  REF_ON );

DSP_STR  = TRI(  _MC097, !ATE);
 _MC097  = DFF(  _EQ153 $  VCC, SCLK( CLK1 ),  VCC,  RST1 );
  _EQ153 =  _MC097 &  _MC106 & !_MC109 & !_MC110 & !_MC111 & !_MC112 &
             !_MC168
         #  _MC097 &  _MC106 & !_MC109 & !_MC110 & !_MC111 &  _MC112
         # !_MC097 & !_MC109 & !_MC110 & !_MC111;

LWADR3   = TRI(  _MC100, !ATE);
 _MC100  = MCELL(  _EQ154 $  _EQ155 );
  _EQ154 =  _MC022 &  _MC141 &  _MC180
         #  _MC014 &  _MC141 & !_MC180
         # !_MC141 &  _MC157 & !_MC180;
  _EQ155 =  _MC031 & !_MC141 &  _MC180;

LWADR4   = TRI(  _MC101, !ATE);
 _MC101  = MCELL(  _EQ156 $  _EQ157 );
  _EQ156 =  _MC021 &  _MC141 &  _MC180
         #  _MC013 &  _MC141 & !_MC180
         #  _MC010 & !_MC141 & !_MC180;
  _EQ157 =  _MC030 & !_MC141 &  _MC180;

VADR3    = TRI(  _MC103, !ATE);
 _MC103  = MCELL(  _EQ158 $  _EQ159 );
  _EQ158 =  _MC076 &  _MC141 &  _MC180
         #  _MC014 &  _MC141 & !_MC180
         # !_MC141 &  _MC157 & !_MC180;
  _EQ159 =  _MC060 & !_MC141 &  _MC180;

VADR4    = TRI(  _MC104, !ATE);
 _MC104  = MCELL(  _EQ160 $  _EQ161 );
  _EQ160 =  _MC075 &  _MC141 &  _MC180
         #  _MC013 &  _MC141 & !_MC180
         #  _MC010 & !_MC141 & !_MC180;
  _EQ161 =  _MC127 & !_MC141 &  _MC180;

% |7474:764|2Q %
 _MC106  = DFF(  _MC107 $  GND, SCLK( CLK1 ),  _EQ162,  VCC );
  _EQ162 =  INIT_ &  _MC097;
```

```
% |7474:764|1Q %
 _MC107  = DFF(  DSP_RDY $  GND, SCLK( CLK1 ),  _EQ163,  VCC );
  _EQ163 =  INIT_ &  _MC097;

% Y_INC %
 Y_INC   = MCELL(  _EQ164 $  VCC );
  _EQ164 =  MB_6 &  TST_INC
         # !MB_6 &  SP_INC;

% |SPSEQ2:770|~19~ %
 _MC109  = DFF(  _EQ165 $  GND, SCLK( CLK1 ),  RST1,  VCC );
  _EQ165 = !_MC097 & !_MC109 & !_MC110 & !_MC111 & !_MC112;

% |SPSEQ2:770|~18~ %
 _MC110  = DFF(  _EQ166 $  GND, SCLK( CLK1 ),  RST1,  VCC );
  _EQ166 = !_MC097 & !_MC109 & !_MC110 & !_MC111 &  _MC112;

% |SPSEQ2:770|~16~ %
 _MC111  = DFF(  _EQ167 $  GND, SCLK( CLK1 ),  RST1,  VCC );
  _EQ167 = !_MC097 &  _MC109 & !_MC110 & !_MC111 & !_MC112;

% |SPSEQ2:770|~15~ %
 _MC112  = DFF(  _EQ168 $  GND, SCLK( CLK1 ),  RST1,  VCC );
  _EQ168 =  _MC097 & !_MC109 & !_MC110 &  _MC111 & !_MC112
         #  _MC097 & !_MC109 & !_MC110 & !_MC111 &  _MC112;

LWADR7   = TRI(  _MC113, !ATE);
 _MC113  = MCELL(  _EQ169 $  VCC );
  _EQ169 =  _X082 &  _X083 &  _X084 &  _X085 &  _X086 &  _X087 &  _X088 &
              _X089 &  _X090 &  _X091;
   _X082 = EXP(  MB_5 &  _MC141 &  _MC150 & !_MC152 & !_MC180 );
   _X083 = EXP(  MB_5 &  _MC141 & !_MC150 &  _MC151 &  _MC152 &  _MC153 & !_MC180 );
   _X084 = EXP(  MB_5 &  _MC141 &  _MC150 & !_MC153 & !_MC180 );
   _X085 = EXP(  MB_5 &  _MC141 &  _MC150 & !_MC151 & !_MC180 );
   _X086 = EXP( !MB_5 &  _MC141 &  _MC152 & !_MC153 & !_MC180 );
   _X087 = EXP( !MB_5 &  _MC141 & !_MC152 &  _MC153 & !_MC180 );
   _X088 = EXP(  MB_5 &  _MC118 &  _MC141 &  _MC180 );
   _X089 = EXP( !MB_5 &  _MC055 &  _MC141 &  _MC180 );
   _X090 = EXP(  _MC008 & !_MC141 & !_MC180 );
   _X091 = EXP(  _MC027 & !_MC141 &  _MC180 );

LWADR8   = TRI(  _MC114, !ATE);
 _MC114  = MCELL(  _EQ170 $  VCC );
  _EQ170 =  _X092 &  _X093 &  _X094 &  _X095 &  _X096 &  _X097 &  _X098 &
              _X099 &  _X100 &  _X101 &  _X102 &  _X103;
   _X092 = EXP(  MB_5 &  _MC141 & !_MC149 &  _MC150 &  _MC151 &  _MC152 &  _MC153 &
             !_MC180 );
   _X093 = EXP(  _MC026 & !_MC141 &  _MC180 );
   _X094 = EXP(  MB_5 &  _MC141 &  _MC149 & !_MC150 & !_MC180 );
   _X095 = EXP( !MB_5 &  _MC141 & !_MC151 &  _MC152 &  _MC153 & !_MC180 );
   _X096 = EXP(  _MC007 & !_MC141 & !_MC180 );
   _X097 = EXP( !MB_5 &  _MC119 &  _MC141 &  _MC180 );
   _X098 = EXP(  MB_5 &  _MC117 &  _MC141 &  _MC180 );
   _X099 = EXP( !MB_5 &  _MC141 &  _MC151 & !_MC153 & !_MC180 );
   _X100 = EXP( !MB_5 &  _MC141 &  _MC151 & !_MC152 & !_MC180 );
   _X101 = EXP(  MB_5 &  _MC141 &  _MC149 & !_MC151 & !_MC180 );
   _X102 = EXP(  MB_5 &  _MC141 &  _MC149 & !_MC153 & !_MC180 );
   _X103 = EXP(  MB_5 &  _MC141 &  _MC149 & !_MC152 & !_MC180 );

VADR7    = TRI(  _MC115, !ATE);
 _MC115  = MCELL(  _EQ171 $  VCC );
  _EQ171 =  _X082 &  _X083 &  _X084 &  _X085 &  _X086 &  _X087 &  _X088 &
              _X089 &  _X090 &  _X104;
   _X104 = EXP(  _MC124 & !_MC141 &  _MC180 );
```

```
VADR8    = TRI(  _MC116, !ATE);
 _MC116  = MCELL(  _EQ172 $  VCC );
  _EQ172 =  _X092 &  _X094 &  _X095 &  _X096 &  _X097 &  _X098 &  _X099 &
             _X100 &  _X101 &  _X102 &  _X103 &  _X105;
  _X105  = EXP(  _MC123 & !_MC141 &  _MC180 );

% |74161:462|QD  %
 _MC117  = DFF(  _EQ173 $  _MC117,  _MC143,  INIT_,  VCC );
  _EQ173 =  MB_4 &  _MC055 &  _MC118 &  _MC119 &  WCRY0 &  _X106
          # !MB_4 &  _MC055 &  _MC118 &  _MC119 &  WCRY2 &  _X106;
  _X106  = EXP( !MB_1 & !_MC120 );

% |74161:462|QC  %
 _MC118  = DFF(  _EQ174 $  _MC118,  _MC143,  INIT_,  VCC );
  _EQ174 =  MB_4 &  _MC055 &  _MC119 &  WCRY0 &  _X106
          # !MB_4 &  _MC055 &  _MC119 &  WCRY2 &  _X106;

% |74161:462|QB  %
 _MC119  = DFF(  _EQ175 $  _MC119,  _MC143,  INIT_,  VCC );
  _EQ175 =  MB_4 &  _MC055 &  WCRY0 &  _X106
          # !MB_4 &  _MC055 &  WCRY2 &  _X106;

% |74161:40|QC  %
 _MC120  = DFF(  _EQ176 $  _EQ177,  _MC143,  VCC,  VCC );
  _EQ176 =  INIT_ & !MB_1 &  MB_4 & !_MC120 &  _MC121 &  _MC122 &  WCRY0
          #  INIT_ & !MB_1 &  MB_4 &  _MC120 & !WCRY0
          #  INIT_ & !MB_1 & !MB_4 &  _MC120 & !WCRY2;
  _EQ177 =  INIT_ & !MB_1 & !MB_4 & !_MC120 &  _MC121 &  _MC122 &  WCRY2;

% |74161:40|QB  %
 _MC121  = DFF(  _EQ178 $  VCC,  _MC143,  VCC,  VCC );
  _EQ178 =  _X107 &  _X108 &  _X109 &  _X110 &  _X111;
  _X107  = EXP(  INIT_ & !MB_1 & !MB_4 & !_MC120 & !_MC121 &  _MC122 &  WCRY2 );
  _X108  = EXP(  INIT_ & !MB_1 &  MB_4 & !_MC120 & !_MC121 &  _MC122 &  WCRY0 );
  _X109  = EXP(  INIT_ & !MB_1 &  MB_4 &  _MC121 & !WCRY0 );
  _X110  = EXP(  INIT_ & !MB_1 & !MB_4 &  _MC121 & !WCRY2 );
  _X111  = EXP(  INIT_ & !MB_1 & !_MC120 &  _MC121 & !_MC122 );

% |74161:40|QA  %
 _MC122  = DFF(  _EQ179 $  _EQ180,  _MC143,  VCC,  VCC );
  _EQ179 =  INIT_ & !MB_1 &  MB_4 & !_MC120 & !_MC122 &  WCRY0
          #  INIT_ & !MB_1 &  MB_4 &  _MC122 & !WCRY0
          #  INIT_ & !MB_1 & !MB_4 &  _MC122 & !WCRY2;
  _EQ180 =  INIT_ & !MB_1 & !MB_4 & !_MC120 & !_MC122 &  WCRY2;

% |8COUNT:119|QG  %
 _MC123  = DFF(  _EQ181 $  _EQ182,  _MC143,  VCC,  VCC );
  _EQ181 =  INIT_ &  _MC060 &  _MC061 &  _MC124 &  _MC125 &  _MC126 &  _MC127 &
             !WCRY2 &  _X073
          #  _MC040 &  WCRY2 &  _X073
          # !INIT_ &  _MC040;
  _EQ182 =  INIT_ &  _MC123 & !WCRY2;

% |8COUNT:119|QF  %
 _MC124  = DFF(  _EQ183 $  _EQ184,  _MC143,  VCC,  VCC );
  _EQ183 =  INIT_ &  _MC060 &  _MC061 &  _MC125 &  _MC126 &  _MC127 & !WCRY2 &
              _X073
          #  _MC004 &  WCRY2 &  _X073
          # !INIT_ &  _MC004;
  _EQ184 =  INIT_ &  _MC124 & !WCRY2;

% |8COUNT:119|QE  %
 _MC125  = DFF(  _EQ185 $  _EQ186,  _MC143,  VCC,  VCC );
  _EQ185 =  INIT_ &  _MC060 &  _MC061 &  _MC126 &  _MC127 & !WCRY2 &  _X073
          #  _MC003 &  WCRY2 &  _X073
```

```
        # !INIT_ &  _MC003;
  _EQ186 =  INIT_ &  _MC125 & !WCRY2;

%  |8COUNT:119|QD  %
 _MC126  = DFF(  _EQ187 $  _EQ188,  _MC143,  VCC,  VCC );
  _EQ187 =  INIT_ &  _MC060 &  _MC061 &  _MC127 & !WCRY2 &  _X073
        #  _MC148 &  WCRY2 &  _X073
        # !INIT_ &  _MC148;
  _EQ188 =  INIT_ &  _MC126 & !WCRY2;

%  |8COUNT:119|QC  %
 _MC127  = DFF(  _EQ189 $  _EQ190,  _MC143,  VCC,  VCC );
  _EQ189 =  INIT_ &  _MC060 &  _MC061 & !WCRY2 &  _X073
        #  _MC002 &  WCRY2 &  _X073
        # !INIT_ &  _MC002;
  _EQ190 =  INIT_ &  _MC127 & !WCRY2;

%  WCRY1  %
 WCRY1   = MCELL(  _EQ191 $  GND );
  _EQ191 =  MB_4 &  _MC060 &  _MC061 &  _MC123 &  _MC124 &  _MC125 &  _MC126 &
              _MC127
        #  _MC060 &  _MC061 &  _MC123 &  _MC124 &  _MC125 &  _MC126 &
              _MC127 &  WCRY0;

CAS_     = TRI(  _MC129, !ATE);
 _MC129  = DFF(  _EQ192 $  _EQ193, SCLK( CLK1 ),  RST1,  VCC );
  _EQ192 = !_MC046 & !_MC063 &  _MC129 &  _MC132 & !_MC141 & !_MC142 &
             !_MC143 &  _MC167 &  _MC168 &  _MC180 &  _MC189 & !_MC190 &
              _X112 &  _X113 &  _X114 &  _X115
        # !MB_0 & !_MC046 & !_MC063 &  _MC129 &  _MC132 & !_MC141 & !_MC142 &
             !_MC143 &  _MC167 &  _MC180 &  _MC189 & !_MC190 &  _X112 &
              _X113 &  _X114 &  _X115
        #  _MC129 & !_MC132 & !_MC141 & !_MC142 & !_MC143 &  _MC180 &
              _MC189 & !_MC190 &  _X112 &  _X113 &  _X114 &  _X115;
  _X112  = EXP( !_MC129 & !_MC132 & !_MC141 & !_MC142 &  _MC143 &  _MC180 &
              _MC189 & !_MC190 );
  _X113  = EXP( !_MC129 &  _MC132 & !_MC141 & !_MC142 & !_MC143 &  _MC180 &
              _MC189 & !_MC190 );
  _X114  = EXP(  _MC129 &  _MC132 & !_MC141 & !_MC142 & !_MC143 & !_MC180 &
              _MC189 & !_MC190 );
  _X115  = EXP(  _MC132 & !_MC141 &  _MC142 & !_MC143 &  _MC180 &  _MC189 &
             !_MC190 );
  _EQ193 =  _X112 &  _X113 &  _X114 &  _X115;

V_EMPTY  = TRI(  _MC131, !ATE);
 _MC131  = MCELL(  _EQ194 $  GND );
  _EQ194 = !_MC137 & !_MC138 & !_MC139 & !_MC140 & !_MC188;

WEN      = TRI(  _MC132, !ATE);
 _MC132  = DFF(  _EQ195 $  _EQ196, SCLK( CLK1 ),  RST1,  VCC );
  _EQ195 = !_MC046 & !_MC063 &  _MC129 &  _MC132 & !_MC141 & !_MC142 &
             !_MC143 &  _MC167 &  _MC168 &  _MC180 &  _MC189 & !_MC190 &
              _X112 &  _X113 &  _X116 &  _X117
        # !MB_0 & !_MC046 & !_MC063 &  _MC129 &  _MC132 & !_MC141 & !_MC142 &
             !_MC143 &  _MC167 &  _MC180 &  _MC189 & !_MC190 &  _X112 &
              _X113 &  _X116 &  _X117
        #  _MC129 &  _MC132 &  _MC141 & !_MC142 & !_MC143 &  _MC180 &
              _MC189 & !_MC190 &  _X112 &  _X113 &  _X116 &  _X117;
  _X116  = EXP(  _MC129 & !_MC132 & !_MC141 & !_MC142 & !_MC143 &  _MC180 &
              _MC189 & !_MC190 );
  _X117  = EXP( !_MC129 & !_MC132 &  _MC141 & !_MC142 & !_MC143 &  _MC180 &
              _MC189 & !_MC190 );
  _EQ196 =  _X112 &  _X113 &  _X116 &  _X117;

%  |7474:509|1Q  %
 _MC134  = DFF(  LOAD1 $  GND, SCLK( CLK1 ),  VCC,  VCC );
```

```
% |7474:398|2Q %
 _MC135  = DFF( _EQ197 $ _MC005, SCLK( CLK1 ), VCC, VCC );
  _EQ197 = MB_0 & _MC005 & !_MC168;

% |7474:233|2Q %
 _MC136  = DFF( _EQ198 $ GND, SCLK( CLK1 ), VCC, VCC );
  _EQ198 = _MC006 & !_MC136;

% |8COUNT:231|QE %
 _MC137  = DFF( _EQ199 $ _MC137, SCLK( CLK1 ), INIT_, VCC );
  _EQ199 = !_MC136 & _MC138 & _MC139 & _MC140 & _MC187 & _MC188
         # _MC136 & !_MC138 & !_MC139 & !_MC140 & !_MC187 & !_MC188;

% |8COUNT:231|QD %
 _MC138  = DFF( _EQ200 $ _MC138, SCLK( CLK1 ), INIT_, VCC );
  _EQ200 = !_MC136 & _MC139 & _MC140 & _MC187 & _MC188
         # _MC136 & !_MC139 & !_MC140 & !_MC187 & !_MC188;

% |8COUNT:231|QC %
 _MC139  = DFF( _EQ201 $ _MC139, SCLK( CLK1 ), INIT_, VCC );
  _EQ201 = !_MC136 & _MC140 & _MC187 & _MC188
         # _MC136 & !_MC140 & !_MC187 & !_MC188;

% |8COUNT:231|QB %
 _MC140  = DFF( _EQ202 $ _MC140, SCLK( CLK1 ), INIT_, VCC );
  _EQ202 = !_MC136 & _MC187 & _MC188
         # _MC136 & !_MC187 & !_MC188;

% |SPSEQ1:769|~31~ %
 _MC141  = DFF( _EQ203 $ _EQ204, SCLK( CLK1 ), RST1, VCC );
  _EQ203 = _MC096 & _MC129 & _MC132 & !_MC135 & !_MC137 & !_MC138 &
            !_MC139 & !_MC140 & _MC141 & _MC142 & !_MC143 & _MC180 &
            !_MC188 & _MC189 & _MC190 & _X115 & _X118 & _X119 & _X120 &
             _X121 & _X122 & _X123 & _X124 & _X125 & _X126 & _X127 &
             _X128 & _X129 & _X130
         # MB_5 & _MC096 & _MC129 & _MC132 & _MC137 & _MC141 & _MC142 &
            !_MC143 & !_MC179 & _MC180 & _MC189 & _MC190 & _X115 &
             _X118 & _X119 & _X120 & _X121 & _X122 & _X123 & _X124 &
             _X125 & _X126 & _X127 & _X128 & _X129 & _X130
         # !MB_5 & _MC096 & _MC129 & _MC132 & _MC139 & _MC141 & _MC142 &
            !_MC143 & !_MC179 & _MC180 & _MC189 & _MC190 & _X115 &
             _X118 & _X119 & _X120 & _X121 & _X122 & _X123 & _X124 &
             _X125 & _X126 & _X127 & _X128 & _X129 & _X130;
   _X118 = EXP( _MC096 & _MC129 & _MC132 & !_MC136 & _MC141 & _MC142 &
            !_MC143 & _MC180 & _MC187 & _MC189 & _MC190 );
   _X119 = EXP( _MC096 & _MC129 & _MC132 & _MC136 & _MC141 & _MC142 &
            !_MC143 & _MC180 & !_MC187 & _MC189 & _MC190 );
   _X120 = EXP( _MC096 & _MC129 & _MC132 & !_MC135 & _MC141 & _MC142 &
            !_MC143 & !_MC179 & _MC180 & _MC189 & _MC190 );
   _X121 = EXP( _MC006 & _MC096 & _MC129 & _MC132 & _MC141 & _MC142 &
            !_MC143 & _MC180 & _MC189 & _MC190 );
   _X122 = EXP( !_MC132 & !_MC141 & !_MC142 & !_MC143 & _MC180 & _MC189 &
            !_MC190 );
   _X123 = EXP( !_MC129 & !_MC132 & !_MC141 & !_MC142 & _MC180 & _MC189 &
            !_MC190 );
   _X124 = EXP( _MC129 & _MC132 & !_MC142 & !_MC143 & !_MC180 & _MC189 &
            !_MC190 );
   _X125 = EXP( _MC059 & _MC096 & _MC129 & _MC132 & _MC141 & _MC142 &
            !_MC143 & _MC180 & _MC189 & _MC190 );

   _X126 = EXP( _MC129 & _MC132 & _MC141 & !_MC142 & !_MC143 & _MC189 &
            !_MC190 );
   _X127 = EXP( _MC096 & _MC132 & !_MC141 & !_MC142 & !_MC143 & !_MC180 &
             _MC189 & !_MC190 );
   _X128 = EXP( !_MC063 & _MC129 & !_MC132 & !_MC142 & !_MC143 & _MC167 &
             _MC180 & _MC189 & !_MC190 );
```

```
_X129  = EXP( !_MC046 & !_MC063 &  _MC129 &  _MC132 & !_MC142 & !_MC143 &
              _MC167 &  _MC189 & !_MC190 );
_X130  = EXP(  MB_0 & !_MC063 &  _MC129 &  _MC132 & !_MC142 & !_MC143 &  _MC167 &
              !_MC168 &  _MC189 & !_MC190 );
_EQ204 =  _X115 &  _X118 &  _X119 &  _X120 &  _X121 &  _X122 &  _X123 &
           _X124 &  _X125 &  _X126 &  _X127 &  _X128 &  _X129 &  _X130;

% |SPSEQ1:769|-29- %
_MC142  = DFF( _EQ205 $  _EQ206, SCLK( CLK1 ),  RST1,  VCC );
_EQ205 =  MB_5 & !_MC006 & !_MC059 &  _MC129 &  _MC132 &  _MC135 &  _MC136 &
          !_MC137 &  _MC141 &  _MC142 & !_MC143 &  _MC180 &  _MC187 &
           _MC189 &  _X122 &  _X123 &  _X124 &  _X131 &  _X132 &  _X133 &
           _X134 &  _X135 &  _X136 &  _X137 &  _X138
       # !MB_5 & !_MC006 & !_MC059 &  _MC129 &  _MC132 &  _MC135 &  _MC136 &
          !_MC139 &  _MC141 &  _MC142 & !_MC143 &  _MC180 &  _MC187 &
           _MC189 &  _X122 &  _X123 &  _X124 &  _X131 &  _X132 &  _X133 &
           _X134 &  _X135 &  _X136 &  _X137 &  _X138
       #  MB_5 & !_MC006 & !_MC059 &  _MC129 &  _MC132 &  _MC135 & !_MC136 &
          !_MC137 &  _MC141 &  _MC142 & !_MC143 &  _MC180 & !_MC187 &
           _MC189 &  _X122 &  _X123 &  _X124 &  _X131 &  _X132 &  _X133 &
           _X134 &  _X135 &  _X136 &  _X137 &  _X138;
_X131  = EXP( !MB_5 & !_MC006 & !_MC059 &  _MC129 &  _MC132 &  _MC135 & !_MC136 &
              !_MC139 &  _MC141 &  _MC142 & !_MC143 &  _MC180 & !_MC187 &
               _MC189 );
_X132  = EXP(  MB_0 & !_MC063 & !_MC096 & !_MC141 & !_MC142 & !_MC143 &  _MC167 &
              !_MC168 &  _MC180 &  _MC189 & !_MC190 );
_X133  = EXP( !_MC046 & !_MC063 & !_MC141 & !_MC142 & !_MC143 &  _MC167 &
               _MC168 &  _MC180 &  _MC189 & !_MC190 );
_X134  = EXP( !MB_0 & !_MC046 & !_MC063 & !_MC141 & !_MC142 & !_MC143 &  _MC167 &
               _MC180 &  _MC189 & !_MC190 );
_X135  = EXP( !_MC063 & !_MC132 & !_MC142 & !_MC143 &  _MC167 &  _MC180 &
               _MC189 & !_MC190 );
_X136  = EXP( !_MC129 &  _MC132 & !_MC141 & !_MC143 &  _MC180 &  _MC189 &
              !_MC190 );
_X137  = EXP(  _MC129 &  _MC132 &  _MC141 & !_MC143 &  _MC189 & !_MC190 );
_X138  = EXP( !_MC129 & !_MC132 & !_MC142 & !_MC143 &  _MC180 &  _MC189 &
              !_MC190 );
_EQ206 =  _X122 &  _X123 &  _X124 &  _X131 &  _X132 &  _X133 &  _X134 &
           _X135 &  _X136 &  _X137 &  _X138;

% |SPSEQ1:769|-26- %
_MC143  = DFF( _EQ207 $  _EQ208, SCLK( CLK1 ),  RST1,  VCC );
_EQ207 = !_MC046 & !_MC063 &  _MC129 &  _MC132 & !_MC141 & !_MC142 &
          !_MC143 &  _MC167 &  _MC168 &  _MC180 &  _MC189 & !_MC190
       # !MB_0 & !_MC046 & !_MC063 &  _MC129 &  _MC132 & !_MC141 & !_MC142 &
          !_MC143 &  _MC167 &  _MC180 &  _MC189 & !_MC190
       #  _MC129 & !_MC132 & !_MC141 & !_MC142 & !_MC143 &  _MC180 &
           _MC189 & !_MC190;
_EQ208 =  _MC129 &  _MC132 & !_MC134 &  _MC141 &  _MC142 & !_MC143 &
           _MC180 & !_MC189 & !_MC190;

% |SPSEQ1:769|REFOFF %
_MC144  = MCELL( _EQ209 $  VCC );
_EQ209 =  _MC143 & !_MC189

       # !_MC129 &  _MC142;

ORDER0   =  _MC145;
_MC145  = DFF( _EQ210 $  GND,  Y_INC,  INIT_,  VCC );
_EQ210 = !MB_1 & !_MC145 & !_MC147;

ORDER1   =  _MC146;
_MC146  = DFF( _EQ211 $  GND,  Y_INC,  INIT_,  VCC );
_EQ211 = !MB_1 & !_MC145 &  _MC146 & !_MC147
       # !MB_1 &  _MC145 & !_MC146 & !_MC147;
```

```
ORDER2   =  _MC147;
_MC147   = DFF(  GND $  _EQ212,  Y_INC,  INIT_,  VCC );
 _EQ212  = !MB_1 &  _MC145 &  _MC146 & !_MC147;

%  |74273:692|:14  %
_MC148   = DFF(  MB_5 $  GND,  LD_PAR1,  VCC,  VCC );

%  |74161:473|QD  %
_MC149   = DFF(  _EQ213 $  _MC149,  _EQ214,  INIT_,  VCC );
 _EQ213 =  MB_1 &  _MC007 &  _MC008 &  _MC009 &  _MC010 &  _MC011 &  _MC012 &
             _MC013 &  _MC014 &  _MC015 &  _MC047 &  _MC048 &  _MC150 &
             _MC151 &  _MC152 &  _MC156 &  _MC157 &  _MC158 &  _MC159 &
             _MC160
        # !MB_1 &  _MC147 &  _MC150 &  _MC151 &  _MC152;
 _EQ214 =  _X001 &  _X002 &  _X003;

%  |74161:473|QC  %
_MC150   = DFF(  _EQ215 $  _MC150,  _EQ216,  INIT_,  VCC );
 _EQ215 =  MB_1 &  _MC007 &  _MC008 &  _MC009 &  _MC010 &  _MC011 &  _MC012 &
             _MC013 &  _MC014 &  _MC015 &  _MC047 &  _MC048 &  _MC151 &
             _MC152 &  _MC156 &  _MC157 &  _MC158 &  _MC159 &  _MC160
        # !MB_1 &  _MC147 &  _MC151 &  _MC152;
 _EQ216 =  _X001 &  _X002 &  _X003;

%  |74161:473|QB  %
_MC151   = DFF(  _EQ217 $  _MC151,  _EQ218,  INIT_,  VCC );
 _EQ217 =  MB_1 &  _MC007 &  _MC008 &  _MC009 &  _MC010 &  _MC011 &  _MC012 &
             _MC013 &  _MC014 &  _MC015 &  _MC047 &  _MC048 &  _MC152 &
             _MC156 &  _MC157 &  _MC158 &  _MC159 &  _MC160
        # !MB_1 &  _MC147 &  _MC152;
 _EQ218 =  _X001 &  _X002 &  _X003;

%  |74161:473|QA  %
_MC152   = DFF(  _EQ219 $  _MC152,  _EQ220,  INIT_,  VCC );
 _EQ219 =  MB_1 &  _MC007 &  _MC008 &  _MC009 &  _MC010 &  _MC011 &  _MC012 &
             _MC013 &  _MC014 &  _MC015 &  _MC047 &  _MC048 &  _MC156 &
             _MC157 &  _MC158 &  _MC159 &  _MC160
        # !MB_1 &  _MC147;
 _EQ220 =  _X001 &  _X002 &  _X003;

%  |7476:513|1Q  %
_MC153   = DFF(  _MC153 $  VCC,  _MC180,  _EQ221,  VCC );
 _EQ221 =  INIT_ &  _X081;

%  |7474:439|1Q  %
_MC154   = DFF(  _EQ222 $  _EQ223,  _EQ224,  _EQ225,  _EQ226 );
 _EQ222 = !MB_1 &  _MC007 &  _MC008 &  _MC009 &  _MC010 &  _MC011 &  _MC012 &
             _MC013 &  _MC014 &  _MC015 &  _MC047 &  _MC048 &  _MC156 &
             _MC157 &  _MC158 &  _MC159 &  _MC160;
 _EQ223 =  _MC007 &  _MC008 &  _MC009 &  _MC010 &  _MC047 &  _MC048 &
             _MC156 &  _MC157 &  _MC158;
 _EQ224 =  _X005 &  _X006;
 _EQ225 =  _X139;
 _X139   = EXP(  INIT_ & !_MC180 );
 _EQ226 =  INIT_ &  Y_REQ;

%  |7474:245|1Q  %
_MC155   = DFF(  _EQ227 $  _MC048,  _EQ228,  _EQ229,  _EQ230 );
 _EQ227 =  _MC007 &  _MC008 &  _MC009 &  _MC010 &  _MC048 &  _MC156 &
             _MC157 &  _MC158
        # !_MC042 &  _MC048
        # !_MC047 &  _MC048;
 _EQ228 =  _X005 &  _X006;
 _EQ229 =  INIT_ & !_MC186;
 _EQ230 =  _X140 &  _X141;
```

```
 _X140   = EXP(  !MB_6 & !_MC141 &  _MC153 & !_MC180 );
 _X141   = EXP(  !MB_6 & !_MC141 & !_MC145 & !_MC146 & !_MC147 & !_MC180 );

% |8COUNT:132|QD  %
 _MC156  = DFF(  _EQ231 $  _EQ232,  _EQ233,  _EQ234,  _EQ235 );
 _EQ231 =  _MC007 &  _MC008 &  _MC009 &  _MC011 &  _MC012 &  _MC013 &
            _MC014 &  _MC015 &  _MC148 &  _MC156 &  _MC159 &  _MC160
       #  INIT_ &  _MC156 &  _X142
       # !INIT_ &  _MC148;
 _X142   = EXP(  _MC010 &  _MC047 &  _MC048 &  _MC157 &  _MC158 );
 _EQ232 =  INIT_ &  _MC010 &  _MC047 &  _MC048 & !_MC156 &  _MC157 &  _MC158;
 _EQ233 =  _X005 &  _X006;
 _EQ234 =  _X143;
 _X143   = EXP( !_MC148 & !Y_REQ );
 _EQ235 =  _X144;
 _X144   = EXP(  _MC148 & !Y_REQ );

% |8COUNT:132|QB  %
 _MC157  = DFF(  _EQ236 $  _EQ237,  _EQ238,  _EQ239,  _EQ240 );
 _EQ236 =  _MC007 &  _MC008 &  _MC009 &  _MC010 &  _MC011 &  _MC012 &
            _MC013 &  _MC014 &  _MC015 &  _MC054 &  _MC156 &  _MC157 &
            _MC159 &  _MC160
       #  INIT_ &  _MC157 &  _X145
       # !INIT_ &  _MC054;
 _X145   = EXP(  _MC047 &  _MC048 &  _MC158 );
 _EQ237 =  NIT_ &  _MC047 &  _MC048 & !_MC157 &  _MC158;
 _EQ238 =  _X005 &  _X006;
 _EQ239 =  _X146;
 _X146   = EXP( !_MC054 & !Y_REQ );
 _EQ240 =  _X147;
 _X147   = EXP(  _MC054 & !Y_REQ );

% |8COUNT:132|QA  %
 _MC158  = DFF(  _EQ241 $  _EQ242,  _EQ243,  _EQ244,  _EQ245 );
 _EQ241 =  _MC007 &  _MC008 &  _MC009 &  _MC010 &  _MC011 &  _MC012 &
            _MC013 &  _MC014 &  _MC015 &  _MC053 &  _MC156 &  _MC157 &
            _MC158 &  _MC159 &  _MC160
       #  INIT_ &  _MC158 &  _X148
       # !INIT_ &  _MC053;
 _X148   = EXP(  _MC047 &  _MC048 );
 _EQ242 =  INIT_ &  _MC047 &  _MC048 & !_MC158;
 _EQ243 =  _X005 &  _X006;
 _EQ244 =  _X149;
 _X149   = EXP( !_MC053 & !Y_REQ );
 _EQ245 =  _X150;
 _X150   = EXP(  _MC053 & !Y_REQ );

% |8COUNT:131|QB  %
 _MC159  = DFF(  _EQ246 $  _EQ247,  _EQ248,  _EQ249,  _EQ250 );
 _EQ246 =  _MC011 &  _MC012 &  _MC013 &  _MC014 &  _MC015 &  _MC070 &
            _MC159
       #  INIT_ &  _MC159 &  _X151
       # !INIT_ &  _MC070;
 _X151   = EXP(  _MC007 &  _MC008 &  _MC009 &  _MC010 &  _MC047 &  _MC048 &
            _MC156 &  _MC157 &  _MC158 &  _MC160 );
 _EQ247 =  INIT_ &  _MC007 &  _MC008 &  _MC009 &  _MC010 &  _MC047 &  _MC048 &
            _MC156 &  _MC157 &  _MC158 & !_MC159 &  _MC160;
 _EQ248 =  _X005 &  _X006;
 _EQ249 =  _X152;
 _X152   = EXP( !_MC070 & !Y_REQ );
 _EQ250 =  _X153;
 _X153   = EXP(  _MC070 & !Y_REQ );

% |8COUNT:131|QA  %
 _MC160  = DFF(  _EQ251 $  _EQ252,  _EQ253,  _EQ254,  _EQ255 );
```

```
  _EQ251 =  _MC011 &  _MC012 &  _MC013 &  _MC014 &  _MC015 &  _MC069 &
              _MC159 &  _MC160
         #  INIT_ &  _MC160 &  _X154
         # !INIT_ &  _MC069;
  _X154  = EXP(  _MC007 &  _MC008 &  _MC009 &  _MC010 &  _MC047 &  _MC048 &
              _MC156 &  _MC157 &  _MC158 );
  _EQ252 =  INIT_ &  _MC007 &  _MC008 &  _MC009 &  _MC010 &  _MC047 &  _MC048 &
              _MC156 &  _MC157 &  _MC158 & !_MC160;
  _EQ253 =  _X005 &  _X006;
  _EQ254 =  _X155;
  _X155  = EXP( !_MC069 & !Y_REQ );
  _EQ255 =  _X156;
  _X156  = EXP(  _MC069 & !Y_REQ );

IF_ACK   = TRI(  _MC161, !ATE);
 _MC161  = DFF(  GND $  GND, !_MC167,  VCC,  BUF_SI );

LW_FLG   = TRI(  _MC162, !ATE);
 _MC162  = MCELL(  _EQ256 $  _EQ257 );
  _EQ256 =  _MC044 &  _MC045 &  _MC166
         # !_MC044 &  _MC045 &  _MC164
         # !_MC044 & !_MC045 &  _MC163;
  _EQ257 =  _MC044 & !_MC045 &  _MC165;

% |74273:759|:19 %
 _MC163  = DFF(  DSP_1 $  GND,  _MC110,  VCC,  VCC );

% |74273:759|:18 %
 _MC164  = DFF(  DSP_3 $  GND,  _MC110,  VCC,  VCC );

% |74273:759|:17 %
 _MC165  = DFF(  DSP_5 $  GND,  _MC110,  VCC,  VCC );

% |74273:759|:16 %
 _MC166  = DFF(  DSP_7 $  GND,  _MC110,  VCC,  VCC );

% |7476:636|2Q %
 _MC167  = DFF(  _MC167 $  VCC,  _MC143,  _EQ258,  VCC );
  _EQ258 =  INIT_ & !_MC190;

% |7474:756|1Q %
 _MC168  = DFF(  VCC $  GND,  _MC110,  _EQ259,  VCC );
  _EQ259 =  INIT_ &  _X157;
  _X157  = EXP( !_MC169 & !_MC170 & !_MC171 & !_MC172 & !_MC173 & !_MC174 &
              !_MC175 & !_MC176 );

% |8COUNT:747|QH %
 _MC169  = DFF(  _EQ260 $  _MC169,  _MC143,  _EQ261,  _EQ262 );
  _EQ260 =  _MC044 &  _MC045 & !_MC170 & !_MC171 & !_MC172 & !_MC173 &
              !_MC174 & !_MC175 & !_MC176
         # !INIT_ & !_MC170 & !_MC171 & !_MC172 & !_MC173 & !_MC174 & !_MC175 &
              !_MC176;
  _EQ261 =  INIT_ &  _X158;
  _X158  = EXP( !DSP_7 &  _MC109 );
  _EQ262 =  _X159;
  _X159  = EXP(  DSP_7 &  INIT_ &  _MC109 );

% |8COUNT:747|QG %
 _MC170  = DFF(  _EQ263 $  _MC170,  _MC143,  _EQ264,  _EQ265 );
  _EQ263 =  _MC044 &  _MC045 & !_MC171 & !_MC172 & !_MC173 & !_MC174 &
              !_MC175 & !_MC176
         # !INIT_ & !_MC171 & !_MC172 & !_MC173 & !_MC174 & !_MC175 & !_MC176;
  _EQ264 =  INIT_ &  _X160;
  _X160  = EXP( !DSP_6 &  _MC109 );
  _EQ265 =  _X161;
  _X161  = EXP(  DSP_6 &  INIT_ &  _MC109 );
```

```
% |8COUNT:747|QF %
_MC171 = DFF( _EQ266 $ _MC171, _MC143, _EQ267, _EQ268 );
_EQ266 = _MC044 & _MC045 & !_MC172 & !_MC173 & !_MC174 & !_MC175 &
    !_MC176
  # !INIT_ & !_MC172 & !_MC173 & !_MC174 & !_MC175 & !_MC176;
_EQ267 = INIT_ & _X162;
_X162 = EXP( !DSP_5 & _MC109 );
_EQ268 = _X163;
_X163 = EXP( DSP_5 & INIT_ & _MC109 );

% |8COUNT:747|QE %
_MC172 = DFF( _EQ269 $ _MC172, _MC143, _EQ270, _EQ271 );
_EQ269 = _MC044 & _MC045 & !_MC173 & !_MC174 & !_MC175 & !_MC176
  # !INIT_ & !_MC173 & !_MC174 & !_MC175 & !_MC176;
_EQ270 = INIT_ & _X164;
_X164 = EXP( !DSP_4 & _MC109 );
_EQ271 = _X165;
_X165 = EXP( DSP_4 & INIT_ & _MC109 );

% |8COUNT:747|QD %
_MC173 = DFF( _EQ272 $ _MC173, _MC143, _EQ273, _EQ274 );
_EQ272 = _MC044 & _MC045 & !_MC174 & !_MC175 & !_MC176
  # !INIT_ & !_MC174 & !_MC175 & !_MC176;
_EQ273 = INIT_ & _X166;
_X166 = EXP( !DSP_3 & _MC109 );
_EQ274 = _X167;
_X167 = EXP( DSP_3 & INIT_ & _MC109 );

% |8COUNT:747|QC %
_MC174 = DFF( _EQ275 $ _MC174, _MC143, _EQ276, _EQ277 );
_EQ275 = _MC044 & _MC045 & !_MC175 & !_MC176
  # !INIT_ & !_MC175 & !_MC176;
_EQ276 = INIT_ & _X168;
_X168 = EXP( !DSP_2 & _MC109 );
_EQ277 = _X169;
_X169 = EXP( DSP_2 & INIT_ & _MC109 );

% |8COUNT:747|QB %
_MC175 = DFF( _EQ278 $ _MC175, _MC143, _EQ279, _EQ280 );
_EQ278 = _MC044 & _MC045 & !_MC176
  # !INIT_ & !_MC176;
_EQ279 = INIT_ & _X170;
_X170 = EXP( !DSP_1 & _MC109 );
_EQ280 = _X171;
_X171 = EXP( DSP_1 & INIT_ & _MC109 );

% |8COUNT:747|QA %
_MC176 = DFF( _EQ281 $ _MC176, _MC143, _EQ282, _EQ283 );
_EQ281 = _MC044 & _MC045
  # !INIT_;
_EQ282 = INIT_ & _X172;
_X172 = EXP( !DSP_0 & _MC109 );
_EQ283 = _X173;
_X173 = EXP( DSP_0 & INIT_ & _MC109 );

% |7474:439|2Q %
_MC179 = DFF( _EQ284 $ _MC094, SCLK( CLK1 ), VCC, VCC );
_EQ284 = !_MC094 & _MC154 & Y_REQ;

TRG = TRI( _MC180, !ATE);
_MC180 = DFF( _EQ285 $ _EQ286, SCLK( CLK1 ), RST1, VCC );
_EQ285 = !_MC006 & !_MC059 & _MC129 & _MC132 & !_MC136 & _MC137 &
    _MC141 & _MC142 & !_MC143 & _MC179 & _MC180 & !_MC187 &
    _MC189 & _MC190 & _X174
  # !_MC006 & !_MC059 & _MC129 & _MC132 & !_MC136 & _MC139 &
    _MC141 & _MC142 & !_MC143 & _MC179 & _MC180 & !_MC187 &
```

```
                _MC189 &  _MC190 &  _X175
          # !_MC006 & !_MC059 &  _MC129 &  _MC132 & !_MC135 & !_MC136 &
                _MC141 &  _MC142 & !_MC143 &  _MC179 &  _MC180 & !_MC187 &
                _MC189 &  _MC190 &  _X176;
  _X174  = EXP( !MB_5 &  _MC135 );
  _X175  = EXP(  MB_5 &  _MC135 );
  _X176  = EXP( !_MC138 & !_MC140 & !_MC188 );
  _EQ286 =  _X114 &  _X177 &  _X178 &  _X179 &  _X180 &  _X181 &  _X182 &
                _X183 &  _X184 &  _X185 &  _X186;
  _X177  = EXP(  MB_5 & !_MC006 & !_MC059 &  _MC129 &  _MC132 &  _MC136 &  _MC137 &
                _MC141 &  _MC142 & !_MC143 &  _MC179 &  _MC180 &  _MC187 &
                _MC189 &  _MC190 );
  _X178  = EXP(  _MC129 &  _MC132 &  _MC141 & !_MC143 & !_MC180 &  _MC189 &
               !_MC190 );
  _X179  = EXP( !_MC006 & !_MC059 &  _MC129 &  _MC132 & !_MC135 &  _MC136 &
                _MC140 &  _MC141 &  _MC142 & !_MC143 &  _MC179 &  _MC180 &
                _MC187 &  _MC189 &  _MC190 );
  _X180  = EXP( !MB_5 & !_MC006 & !_MC059 &  _MC129 &  _MC132 &  _MC136 &  _MC139 &
                _MC141 &  _MC142 & !_MC143 &  _MC179 &  _MC180 &  _MC187 &
                _MC189 &  _MC190 );
  _X181  = EXP( !_MC129 & !_MC132 & !_MC141 & !_MC142 & !_MC143 & !_MC180 &
               !_MC189 & !_MC190 );
  _X182  = EXP( !_MC006 & !_MC059 &  _MC129 &  _MC132 & !_MC135 &  _MC136 &
                _MC137 &  _MC141 &  _MC142 & !_MC143 &  _MC179 &  _MC180 &
                _MC187 &  _MC189 &  _MC190 );
  _X183  = EXP(  _MC129 &  _MC132 & !_MC134 &  _MC141 &  _MC142 & !_MC143 &
               !_MC180 & !_MC189 & !_MC190 );
  _X184  = EXP( !_MC006 & !_MC059 &  _MC129 &  _MC132 & !_MC135 &  _MC136 &
                _MC141 &  _MC142 & !_MC143 &  _MC179 &  _MC180 &  _MC187 &
                _MC188 &  _MC189 &  _MC190 );
  _X185  = EXP( !_MC006 & !_MC059 &  _MC129 &  _MC132 & !_MC135 &  _MC136 &
                _MC138 &  _MC141 &  _MC142 & !_MC143 &  _MC179 &  _MC180 &
                _MC187 &  _MC189 &  _MC190 );
  _X186  = EXP( !_MC006 & !_MC059 &  _MC129 &  _MC132 & !_MC135 &  _MC136 &
                _MC139 &  _MC141 &  _MC142 & !_MC143 &  _MC179 &  _MC180 &
                _MC187 &  _MC189 &  _MC190 );

V_FULL   = TRI(  _MC181, !ATE);
 _MC181  = MCELL(  _EQ287 $  GND );
  _EQ287 =  MB_5 &  _MC137
          # !MB_5 &  _MC139;

V_HFULL  = TRI(  _MC182, !ATE);
 _MC182  = MCELL(  _EQ288 $  GND );
  _EQ288 =  MB_5 &  _MC138
          # !MB_5 &  _MC140;

V_ORDY_  = TRI(  _MC183, !ATE);
 _MC183  = MCELL(  _EQ289 $  VCC );
  _EQ289 = !MB_6 & !_MC094 & !_MC154 & !_MC155 &  _MC180 & !_MC185 & !_MC186 &
               SP_STR &  _X187;
  _X187  = EXP( !_MC137 & !_MC138 & !_MC139 & !_MC140 & !_MC188 );

V_SCLK   = TRI(  _MC184, !ATE);
 _MC184  = MCELL(  _EQ290 $  VCC );
  _EQ290 =  INIT_ &  MB_6 & !_MC185 &  TST_STR
          #  INIT_ & !MB_6 & !_MC185 &  SP_STR
          # !_MC143 & !_MC185 & !NEW_DATA;

% |7474:368|1Q  %
 _MC185  = DFF(  _MC186 $  GND, SCLK( CLK1 ),  VCC,  VCC );

% |7474:245|2Q  %
 _MC186  = DFF(  _EQ291 $  GND, SCLK( CLK1 ),  VCC,  VCC );
```

```
_EQ291 =  INIT_ &  MB_6 &  _MC155 &  TST_STR
       #  INIT_ & !MB_6 &  _MC155 &  SP_STR
       # !_MC143 &  _MC155 & !NEW_DATA;

% |7474:233|1Q %
_MC187  = DFF(  _EQ292 $  GND, SCLK( CLK1 ),  VCC,  VCC );
_EQ292 =  _MC059 & !_MC187;

% |8COUNT:231|QA %
_MC188  = DFF(  _EQ293 $  _MC188, SCLK( CLK1 ),  INIT_,  VCC );
_EQ293 = !_MC136 &  _MC187
       #  _MC136 & !_MC187;

% |SPSEQ1:769|-27- %
_MC189  = DFF(  _EQ294 $  VCC, SCLK( CLK1 ),  RST1,  VCC );
_EQ294 = !_MC129 & !_MC132 & !_MC141 & !_MC142 & !_MC143 & !_MC180 &
          !_MC189 & !_MC190
       #  _MC129 &  _MC132 &  _MC141 &  _MC142 & !_MC143 & !_MC189 &
          !_MC190;

% |SPSEQ1:769|-25- %
_MC190  = DFF(  _EQ295 $  VCC, SCLK( CLK1 ),  RST1,  VCC );
_EQ295 =  _X188 &  _X189 &  _X190 &  _X191 &  _X192 &  _X193 &  _X194 &
           _X195 &  _X196 &  _X197 &  _X198 &  _X199 &  _X200 &  _X201;
_X188  = EXP( !_MC096 &  _MC129 &  _MC132 & !_MC135 & !_MC137 & !_MC138 &
          !_MC139 & !_MC140 &  _MC141 &  _MC142 & !_MC143 &  _MC180 &
          !_MC188 &  _MC189 &  _MC190 );
_X189  = EXP(  _MC129 &  _MC132 &  _MC141 &  _MC142 &  _MC143 &  _MC180 &
          !_MC189 & !_MC190 );
_X190  = EXP(  _MC006 & !_MC096 &  _MC129 &  _MC132 &  _MC141 &  _MC142 &
          !_MC143 &  _MC180 &  _MC189 &  _MC190 );
_X191  = EXP(  MB_5 & !_MC096 &
```

APPENDIX - J

COLOR1

| Signal_name | Physical_location | Pin_number | Part_name |
|---|---|---|---|
| 0:XSIG870 | L5 | 17 | LS240 |
| 0:XSIG870 | RL4 | 2 | RES |
| 0:XSIG873 | REF15 | 2 | RES |
| 0:XSIG902 | L3 | 15 | LS244 |
| 0:XSIG902 | RL2 | 2 | RES |
| 3:XSIG381 | H18 | 1 | LS374 |
| 3:XSIG381 | H3 | 8 | LS00 |
| 3:XSIG383 | H16 | 1 | LS374 |
| 3:XSIG383 | H3 | 11 | LS00 |
| 4DLUT10 | L15 | 17 | LS245 |
| 4DLUT10 | D27 | 20 | S128K8 |
| 4DLUT10 | A25 | 32 | CBX |
| 4DLUT11 | L15 | 16 | LS245 |
| 4DLUT11 | D27 | 19 | S128K8 |
| 4DLUT11 | A25 | 33 | CBX |
| 4DLUT1 | L14 | 18 | LS245 |
| 4DLUT1 | D21 | 21 | S128K8 |
| 4DLUT12 | L15 | 15 | LS245 |
| 4DLUT12 | D27 | 18 | S128K8 |
| 4DLUT12 | A25 | 34 | CBX |
| 4DLUT13 | L15 | 14 | LS245 |
| 4DLUT13 | D27 | 17 | S128K8 |
| 4DLUT13 | A25 | 35 | CBX |
| 4DLUT14 | L15 | 13 | LS245 |
| 4DLUT14 | D27 | 15 | S128K8 |
| 4DLUT14 | A25 | 38 | CBX |
| 4DLUT15 | L15 | 12 | LS245 |
| 4DLUT15 | D27 | 14 | S128K8 |

| Signal_name | Physical_location | Pin_number | Part_name |
|---|---|---|---|
| 4DLUT15 | A25 | 39 | CBX |
| 4DLUT16 | L15 | 11 | LS245 |
| 4DLUT16 | D27 | 13 | S128K8 |
| 4DLUT16 | A25 | 40 | CBX |
| 4DLUT17 | H11 | 18 | LS245 |
| 4DLUT17 | BC27 | 21 | S128K8 |
| 4DLUT17 | A25 | 41 | CBX |
| 4DLUT18 | H11 | 17 | LS245 |
| 4DLUT18 | BC27 | 20 | S128K8 |
| 4DLUT18 | A25 | 42 | CBX |
| 4DLUT19 | H11 | 16 | LS245 |
| 4DLUT19 | BC27 | 19 | S128K8 |
| 4DLUT19 | A25 | 43 | CBX |
| 4DLUT20 | H11 | 15 | LS245 |
| 4DLUT20 | BC27 | 18 | S128K8 |
| 4DLUT20 | A25 | 44 | CBX |
| 4DLUT21 | H11 | 14 | LS245 |
| 4DLUT21 | BC27 | 17 | S128K8 |
| 4DLUT21 | A25 | 45 | CBX |
| 4DLUT2 | L14 | 17 | LS245 |
| 4DLUT2 | D21 | 20 | S128K8 |
| 4DLUT22 | H11 | 13 | LS245 |
| 4DLUT22 | BC27 | 15 | S128K8 |
| 4DLUT2 | A25 | 22 | CBX |
| 4DLUT22 | A25 | 46 | CBX |
| 4DLUT23 | H11 | 12 | LS245 |
| 4DLUT23 | BC27 | 14 | S128K8 |
| 4DLUT23 | A25 | 47 | CBX |
| 4DLUT24 | H11 | 11 | LS245 |
| 4DLUT24 | BC27 | 13 | S128K8 |
| 4DLUT24 | A25 | 48 | CBX |
| 4DLUT25 | L9 | 18 | LS245 |
| 4DLUT25 | A27 | 21 | S128K8 |
| 4DLUT25 | A25 | 49 | CBX |
| 4DLUT26 | L9 | 17 | LS245 |
| 4DLUT26 | A27 | 20 | S128K8 |
| 4DLUT26 | A25 | 50 | CBX |
| 4DLUT27 | L9 | 16 | LS245 |
| 4DLUT27 | A27 | 19 | S128K8 |
| 4DLUT27 | A25 | 51 | CBX |
| 4DLUT28 | L9 | 15 | LS245 |
| 4DLUT28 | A27 | 18 | S128K8 |
| 4DLUT28 | A25 | 52 | CBX |
| 4DLUT29 | L9 | 14 | LS245 |
| 4DLUT29 | A27 | 17 | S128K8 |
| 4DLUT29 | A25 | 53 | CBX |
| 4DLUT30 | L9 | 13 | LS245 |
| 4DLUT30 | A27 | 15 | S128K8 |
| 4DLUT30 | A25 | 54 | CBX |
| 4DLUT31 | L9 | 12 | LS245 |
| 4DLUT31 | A27 | 14 | S128K8 |
| 4DLUT31 | A25 | 55 | CBX |
| 4DLUT3 | L14 | 16 | LS245 |
| 4DLUT3 | D21 | 19 | S128K8 |
| 4DLUT32 | L9 | 11 | LS245 |
| 4DLUT32 | A27 | 13 | S128K8 |
| 4DLUT3 | A25 | 23 | CBX |
| 4DLUT32 | A25 | 56 | CBX |
| 4DLUT33 | H12 | 18 | LS245 |
| 4DLUT33 | BC21 | 21 | S128K8 |
| 4DLUT33 | A25 | 57 | CBX |
| 4DLUT34 | H12 | 17 | LS245 |
| 4DLUT34 | BC21 | 20 | S128K8 |
| 4DLUT34 | A25 | 58 | CBX |
| 4DLUT35 | H12 | 16 | LS245 |
| 4DLUT35 | BC21 | 19 | S128K8 |
| 4DLUT35 | A25 | 61 | CBX |

| Signal_name | Physical_location | Pin_number | Part_name |
|---|---|---|---|
| 4DLUT36 | H12 | 15 | LS245 |
| 4DLUT36 | BC21 | 18 | S128K8 |
| 4DLUT36 | A25 | 62 | CBX |
| 4DLUT37 | H12 | 14 | LS245 |
| 4DLUT37 | BC21 | 17 | S128K8 |
| 4DLUT37 | A25 | 63 | CBX |
| 4DLUT38 | H12 | 13 | LS245 |
| 4DLUT38 | BC21 | 15 | S128K8 |
| 4DLUT38 | A25 | 64 | CBX |
| 4DLUT39 | H12 | 12 | LS245 |
| 4DLUT39 | BC21 | 14 | S128K8 |
| 4DLUT39 | A25 | 65 | CBX |
| 4DLUT40 | H12 | 11 | LS245 |
| 4DLUT40 | BC21 | 13 | S128K8 |
| 4DLUT40 | A25 | 66 | CBX |
| 4DLUT4 | L14 | 15 | LS245 |
| 4DLUT4 | D21 | 18 | S128K8 |
| 4DLUT4 | A25 | 24 | CBX |
| 4DLUT5 | L14 | 14 | LS245 |
| 4DLUT5 | D21 | 17 | S128K8 |
| 4DLUT5 | A25 | 25 | CBX |
| 4DLUT6 | L14 | 13 | LS245 |
| 4DLUT6 | D21 | 15 | S128K8 |
| 4DLUT6 | A25 | 26 | CBX |
| 4DLUT7 | L14 | 12 | LS245 |
| 4DLUT7 | D21 | 14 | S128K8 |
| 4DLUT7 | A25 | 27 | CBX |
| 4DLUT8 | L14 | 11 | LS245 |
| 4DLUT8 | D21 | 13 | S128K8 |
| 4DLUT8 | A25 | 30 | CBX |
| 4DLUT9 | L15 | 18 | LS245 |
| 4DLUT9 | D27 | 21 | S128K8 |
| 4DLUT9 | A25 | 31 | CBX |
| 4D_LOAD~ | H5 | 16 | PAL22V10A |
| 4D_LOAD~ | BC21 | 29 | S128K8 |
| 4D_SEL0 | EF7 | 1 | PAL22V10A |
| 4D_SEL0 | L13 | 2 | LS374 |
| 4D_SEL1 | EF7 | 2 | PAL22V10A |
| 4D_SEL1 | L13 | 5 | LS374 |
| 4D_SEL2 | EF7 | 3 | PAL22V10A |
| 4D_SEL2 | L13 | 6 | LS374 |
| 4D_SEL3 | EF7 | 4 | PAL22V10A |
| 4D_SEL3 | L13 | 9 | LS374 |
| 9:XSIG135 | EF14 | 6 | LS240 |
| 9:XSIG135 | EF10 | 8 | OSC |
| 9:XSIG140 | BC7 | 123 | DSP96002 |
| 9:XSIG140 | EF14 | 14 | LS240 |
| 9:XSIG286 | H3 | 6 | LS00 |
| 9:XSIG286 | EF14 | 8 | LS240 |
| ACK_EN | EF6 | 2 | LS240 |
| ACK_EN | H2 | 5 | LS164 |
| ACK_EN~ | EF6 | 18 | LS240 |
| ACK_EN~ | H1 | 4 | LS125 |
| ADR10~ | L6 | 4 | LS240 |
| ADR10~ | | P1 57 | CONNECTOR |
| ADR11~ | L6 | 6 | LS240 |
| ADR11~ | | P1 58 | CONNECTOR |
| ADR12~ | L6 | 8 | LS240 |
| ADR12~ | | P1 55 | CONNECTOR |
| ADR13~ | L6 | 11 | LS240 |
| ADR13~ | | P1 56 | CONNECTOR |
| ADR14~ | L6 | 13 | LS240 |
| ADR14~ | | P1 53 | CONNECTOR |
| ADR15~ | L6 | 15 | LS240 |
| ADR15~ | | P1 54 | CONNECTOR |
| ADR16~ | L6 | 17 | LS240 |

| Signal_name | Physical_location | Pin_number | Part_name |
|---|---|---|---|
| ADR16~ | | P1 34 | CONNECTOR |
| ADR17~ | L5 | 2 | LS240 |
| ADR17~ | | P1 36 | CONNECTOR |
| ADR18~ | L5 | 4 | LS240 |
| ADR18~ | | P1 38 | CONNECTOR |
| ADR19~ | L5 | 6 | LS240 |
| ADR19~ | | P1 40 | CONNECTOR |
| ADR1~ | L7 | 2 | LS240 |
| ADR1~ | | P1 70 | CONNECTOR |
| ADR20~ | L5 | 8 | LS240 |
| ADR20~ | | P2 83 | CONNECTOR |
| ADR21~ | L5 | 11 | LS240 |
| ADR21~ | | P2 78 | CONNECTOR |
| ADR22~ | L5 | 13 | LS240 |
| ADR22~ | | P2 81 | CONNECTOR |
| ADR23~ | L5 | 15 | LS240 |
| ADR23~ | | P2 76 | CONNECTOR |
| ADR2~ | L7 | 4 | LS240 |
| ADR2~ | | P1 67 | CONNECTOR |
| ADR3~ | L7 | 6 | LS240 |
| ADR3~ | | P1 68 | CONNECTOR |
| ADR4~ | L7 | 8 | LS240 |
| ADR4~ | | P1 65 | CONNECTOR |
| ADR5~ | L7 | 11 | LS240 |
| ADR5~ | | P1 66 | CONNECTOR |
| ADR6~ | L7 | 13 | LS240 |
| ADR6~ | | P1 63 | CONNECTOR |
| ADR7~ | L7 | 15 | LS240 |
| ADR7~ | | P1 64 | CONNECTOR |
| ADR8~ | L7 | 17 | LS240 |
| ADR8~ | | P1 59 | CONNECTOR |
| ADR9~ | L6 | 2 | LS240 |
| ADR9~ | | P1 60 | CONNECTOR |
| ATE | H5 | 1 | PAL22V10A |
| ATE | EF7 | 13 | PAL22V10A |
| ATE | EF14 | 18 | LS240 |
| BCLK~ | H2 | 8 | LS164 |
| BCLK~ | L3 | 9 | LS244 |
| BINIT~ | H4 | 11 | PAL22V10A |
| BINIT~ | L3 | 12 | LS244 |
| BIORDC~ | H7 | 15 | PAL22V10A |
| BIORDC~ | L3 | 7 | LS244 |
| BIOWDC~ | H7 | 14 | PAL22V10A |
| BMRDC~ | H5 | 11 | PAL22V10A |
| BMRDC~ | L3 | 18 | LS244 |
| BMWDC~ | H5 | 13 | PAL22V10A |
| BMWDC~ | L3 | 16 | LS244 |
| BUF_SEL | L12 | 15 | LS374 |
| BUF_SEL | BC17 | 42 | EPM5192 |
| BUF_SEL | EF24 | 66 | EPM5128 |
| BUF_SEL | L24 | 68 | EPM5128 |
| BUF_TEST | A25 | 126 | CBX |
| BUF_TEST | L12 | 16 | LS374 |
| BUF_TEST | EF24 | 32 | EPM5128 |
| BUF_TEST | BC17 | 41 | EPM5192 |
| BUF_TEST | BC11 | 55 | EPM5128 |
| BUF_TEST | EF6 | 6 | LS240 |
| BUF_TEST | BC17 | 84 | EPM5192 |
| BUF_TEST~ | L16 | 1 | LS244 |
| BUF_TEST~ | EF6 | 14 | LS240 |
| BUF_TEST~ | L16 | 19 | LS244 |
| CBX_BUSY | A25 | 140 | CBX |
| CBX_BUSY | H10 | 2 | LS244 |
| CBX_IN0 | A25 | 131 | CBX |
| CBX_IN0 | D11 | 15 | LS244 |
| CBX_IN1 | A25 | 132 | CBX |
| CBX_IN1 | D11 | 17 | LS244 |

| Signal_name | Physical_location | Pin_number | Part_name |
|---|---|---|---|
| CBX_PROG~ | A25 | 125 | CBX |
| CBX_PROG~ | H7 | 20 | PAL22V10A |
| CBX_RDBK | L13 | 12 | LS374 |
| CBX_RDBK | EF7 | 5 | PAL22V10A |
| CBX_TEST~ | A25 | 124 | CBX |
| CBX_TEST~ | H7 | 19 | PAL22V10A |
| CCLK~ | L3 | 11 | LS244 |
| CCLK~ | | P1 37 | CONNECTOR |
| CLK | H4 | 1 | PAL22V10A |
| CLK | A25 | 128 | CBX |
| CLK1 | EF14 | 4 | LS240 |
| CLK | EF14 | 16 | LS240 |
| CLK1 | EF12 | 8 | OSC |
| CT_BUF | BC17 | 44 | EPM5192 |
| CT_BUF | L12 | 5 | LS374 |
| DAT0~ | L10 | 2 | LS640 |
| DAT0~ | | P1 89 | CONNECTOR |
| DAT1~ | L10 | 3 | LS640 |
| DAT1~ | | P1 90 | CONNECTOR |
| DAT2~ | L10 | 4 | LS640 |
| DAT2~ | | P1 87 | CONNECTOR |
| DAT3~ | L10 | 5 | LS640 |
| DAT3~ | | P1 88 | CONNECTOR |
| DAT4~ | L10 | 6 | LS640 |
| DAT4~ | | P1 85 | CONNECTOR |
| DAT5~ | L10 | 7 | LS640 |
| DAT5~ | | P1 86 | CONNECTOR |
| DAT6~ | L10 | 8 | LS640 |
| DAT6~ | | P1 83 | CONNECTOR |
| DAT7~ | L10 | 9 | LS640 |
| DAT7~ | | P1 84 | CONNECTOR |
| DAT8~ | L8 | 2 | LS640 |
| DAT8~ | | P1 79 | CONNECTOR |
| DAT9~ | L8 | 3 | LS640 |
| DAT9~ | | P1 80 | CONNECTOR |
| DATA~ | L8 | 4 | LS640 |
| DATA~ | | P1 77 | CONNECTOR |
| DATB~ | L8 | 5 | LS640 |
| DATB~ | | P1 78 | CONNECTOR |
| DATC~ | L8 | 6 | LS640 |
| DATC~ | | P1 75 | CONNECTOR |
| DATD~ | L8 | 7 | LS640 |
| DATD~ | | P1 76 | CONNECTOR |
| DATE~ | L8 | 8 | LS640 |
| DATE~ | | P1 73 | CONNECTOR |
| DATF~ | L8 | 9 | LS640 |
| DATF~ | | P1 74 | CONNECTOR |
| DR~ | BC7 | 167 | DSP96002 |
| DR~ | TP1 | 4 | TPS5 |
| DSO | TP1 | 2 | TPS5 |
| DSO | BC7 | 52 | DSP96002 |
| DSP_AA0 | D10 | 18 | LS244 |
| DSP_AA0 | BC4 | 2 | P4C164 |
| DSP_AA0 | BC7 | 78 | DSP96002 |
| DSP_AA10 | EF1 | 14 | LS244 |
| DSP_AA10 | BC7 | 16 | DSP96002 |
| DSP_AA10 | BC4 | 23 | P4C164 |
| DSP_AA11 | EF1 | 12 | LS244 |
| DSP_AA11 | BC4 | 24 | P4C164 |
| DSP_AA1 | BC7 | 136 | DSP96002 |
| DSP_AA1 | D10 | 16 | LS244 |
| DSP_AA11 | BC7 | 82 | DSP96002 |
| DSP_AA11 | EF1 | 9 | LS244 |
| DSP_AA12 | BC7 | 139 | DSP96002 |
| DSP_AA1 | BC4 | 3 | P4C164 |
| DSP_AA13 | BC7 | 17 | DSP96002 |
| DSP_AA14 | BC7 | 83 | DSP96002 |
| DSP_AA15 | BC7 | 140 | DSP96002 |

| Signal_name | Physical_location | Pin_number | Part_name |
|---|---|---|---|
| DSP_AA16 | BC7 | 18 | DSP96002 |
| DSP_AA16 | BC4 | 25 | P4C164 |
| DSP_AA17 | BC7 | 141 | DSP96002 |
| DSP_AA18 | BC7 | 84 | DSP96002 |
| DSP_AA19 | BC7 | 142 | DSP96002 |
| DSP_AA20 | BC7 | 19 | DSP96002 |
| DSP_AA2 | BC7 | 13 | DSP96002 |
| DSP_AA2 | D10 | 14 | LS244 |
| DSP_AA21 | BC7 | 85 | DSP96002 |
| DSP_AA22 | BC7 | 143 | DSP96002 |
| DSP_AA23 | BC7 | 20 | DSP96002 |
| DSP_AA2 | BC4 | 4 | P4C164 |
| DSP_AA24 | BC7 | 144 | DSP96002 |
| DSP_AA25 | BC7 | 86 | DSP96002 |
| DSP_AA26 | BC7 | 21 | DSP96002 |
| DSP_AA27 | BC7 | 145 | DSP96002 |
| DSP_AA28 | BC7 | 87 | DSP96002 |
| DSP_AA29 | BC7 | 22 | DSP96002 |
| DSP_AA30 | A5 | 15 | PAL22V10A |
| DSP_AA30 | BC7 | 88 | DSP96002 |
| DSP_AA31 | A5 | 14 | PAL22V10A |
| DSP_AA31 | BC7 | 146 | DSP96002 |
| DSP_AA3 | D10 | 12 | LS244 |
| DSP_AA3 | BC4 | 5 | P4C164 |
| DSP_AA3 | BC7 | 79 | DSP96002 |
| DSP_AA4 | BC7 | 14 | DSP96002 |
| DSP_AA4 | BC4 | 6 | P4C164 |
| DSP_AA4 | D10 | 9 | LS244 |
| DSP_AA5 | BC7 | 137 | DSP96002 |
| DSP_AA5 | BC4 | 7 | P4C164 |
| DSP_AA6 | D10 | 5 | LS244 |
| DSP_AA6 | BC4 | 8 | P4C164 |
| DSP_AA6 | BC7 | 80 | DSP96002 |
| DSP_AA7 | BC7 | 15 | DSP96002 |
| DSP_AA7 | D10 | 3 | LS244 |
| DSP_AA7 | BC4 | 9 | P4C164 |
| DSP_AA8 | BC4 | 10 | P4C164 |
| DSP_AA8 | BC7 | 138 | DSP96002 |
| DSP_AA8 | EF1 | 18 | LS244 |
| DSP_AA9 | EF1 | 16 | LS244 |
| DSP_AA9 | BC4 | 21 | P4C164 |
| DSP_AA9 | BC7 | 81 | DSP96002 |
| DSP_AD0 | A4 | 11 | P4C164 |
| DSP_AD0 | EF2 | 18 | LS245 |
| DSP_AD0 | BC7 | 36 | DSP96002 |
| DSP_AD0 | A3 | 6 | CY7C429 |
| DSP_AD10 | BC4 | 13 | P4C164 |
| DSP_AD10 | A2 | 16 | LS245 |
| DSP_AD10 | BC7 | 32 | DSP96002 |
| DSP_AD10 | D3 | 4 | CY7C429 |
| DSP_AD11 | BC4 | 15 | P4C164 |
| DSP_AD11 | BC7 | 152 | DSP96002 |
| DSP_AD1 | A4 | 12 | P4C164 |
| DSP_AD11 | D3 | 3 | CY7C429 |
| DSP_AD1 | EF2 | 17 | LS245 |
| DSP_AD12 | A2 | 14 | LS245 |
| DSP_AD12 | BC4 | 16 | P4C164 |
| DSP_AD12 | D3 | 27 | CY7C429 |
| DSP_AD12 | BC7 | 96 | DSP96002 |
| DSP_AD13 | A2 | 13 | LS245 |
| DSP_AD13 | BC4 | 17 | P4C164 |
| DSP_AD13 | D3 | 26 | CY7C429 |
| DSP_AD13 | BC7 | 31 | DSP96002 |
| DSP_AD1 | BC7 | 35 | DSP96002 |
| DSP_AD14 | A2 | 12 | LS245 |
| DSP_AD14 | BC4 | 18 | P4C164 |
| DSP_AD14 | D3 | 25 | CY7C429 |

| Signal_name | Physical_location | Pin_number | Part_name |
|---|---|---|---|
| DSP_AD14 | BC7 | 95 | DSP96002 |
| DSP_AD1 | A3 | 5 | CY7C429 |
| DSP_AD15 | A2 | 11 | LS245 |
| DSP_AD15 | BC4 | 19 | P4C164 |
| DSP_AD15 | D3 | 24 | CY7C429 |
| DSP_AD15 | BC7 | 30 | DSP96002 |
| DSP_AD16 | D4 | 11 | P4C164 |
| DSP_AD16 | BC7 | 150 | DSP96002 |
| DSP_AD16 | D2 | 18 | LS245 |
| DSP_AD17 | D4 | 12 | P4C164 |
| DSP_AD17 | D2 | 17 | LS245 |
| DSP_AD17 | BC7 | 29 | DSP96002 |
| DSP_AD18 | D4 | 13 | P4C164 |
| DSP_AD18 | D2 | 16 | LS245 |
| DSP_AD18 | BC7 | 93 | DSP96002 |
| DSP_AD19 | D4 | 15 | P4C164 |
| DSP_AD19 | BC7 | 28 | DSP96002 |
| DSP_AD20 | D2 | 14 | LS245 |
| DSP_AD20 | BC7 | 149 | DSP96002 |
| DSP_AD20 | D4 | 16 | P4C164 |
| DSP_AD21 | D2 | 13 | LS245 |
| DSP_AD21 | D4 | 17 | P4C164 |
| DSP_AD2 | A4 | 13 | P4C164 |
| DSP_AD2 | BC7 | 155 | DSP96002 |
| DSP_AD2 | EF2 | 16 | LS245 |
| DSP_AD21 | BC7 | 92 | DSP96002 |
| DSP_AD22 | D2 | 12 | LS245 |
| DSP_AD22 | D4 | 18 | P4C164 |
| DSP_AD22 | BC7 | 27 | DSP96002 |
| DSP_AD23 | D2 | 11 | LS245 |
| DSP_AD23 | D4 | 19 | P4C164 |
| DSP_AD23 | BC7 | 26 | DSP96002 |
| DSP_AD2 | A3 | 4 | CY7C429 |
| DSP_AD24 | EF4 | 11 | P4C164 |
| DSP_AD24 | BC7 | 148 | DSP96002 |
| DSP_AD24 | BC2 | 18 | LS245 |
| DSP_AD25 | EF4 | 12 | P4C164 |
| DSP_AD25 | BC2 | 17 | LS245 |
| DSP_AD25 | BC7 | 91 | DSP96002 |
| DSP_AD26 | EF4 | 13 | P4C164 |
| DSP_AD26 | BC2 | 16 | LS245 |
| DSP_AD26 | BC7 | 25 | DSP96002 |
| DSP_AD27 | EF4 | 15 | P4C164 |
| DSP_AD27 | BC7 | 90 | DSP96002 |
| DSP_AD28 | BC2 | 14 | LS245 |
| DSP_AD28 | BC7 | 147 | DSP96002 |
| DSP_AD28 | EF4 | 16 | P4C164 |
| DSP_AD29 | BC2 | 13 | LS245 |
| DSP_AD29 | EF4 | 17 | P4C164 |
| DSP_AD29 | BC7 | 24 | DSP96002 |
| DSP_AD30 | BC2 | 12 | LS245 |
| DSP_AD30 | EF4 | 18 | P4C164 |
| DSP_AD30 | BC7 | 89 | DSP96002 |
| DSP_AD31 | BC2 | 11 | LS245 |
| DSP_AD31 | EF4 | 19 | P4C164 |
| DSP_AD31 | BC7 | 23 | DSP96002 |
| DSP_AD3 | EF2 | 15 | LS245 |
| DSP_AD3 | A3 | 3 | CY7C429 |
| DSP_AD3 | BC7 | 99 | DSP96002 |
| DSP_AD4 | EF2 | 14 | LS245 |
| DSP_AD4 | A4 | 16 | P4C164 |
| DSP_AD4 | A3 | 27 | CY7C429 |
| DSP_AD4 | BC7 | 34 | DSP96002 |
| DSP_AD5 | EF2 | 13 | LS245 |
| DSP_AD5 | BC7 | 154 | DSP96002 |
| DSP_AD5 | A4 | 17 | P4C164 |
| DSP_AD5 | A3 | 26 | CY7C429 |

| Signal_name | Physical_location | Pin_number | Part_name |
|---|---|---|---|
| DSP_AD6 | EF2 | 12 | LS245 |
| DSP_AD6 | A4 | 18 | P4C164 |
| DSP_AD6 | A3 | 25 | CY7C429 |
| DSP_AD6 | BC7 | 98 | DSP96002 |
| DSP_AD7 | EF2 | 11 | LS245 |
| DSP_AD7 | BC7 | 153 | DSP96002 |
| DSP_AD7 | A4 | 19 | P4C164 |
| DSP_AD7 | A3 | 24 | CY7C429 |
| DSP_AD8 | BC4 | 11 | P4C164 |
| DSP_AD8 | A2 | 18 | LS245 |
| DSP_AD8 | A3 | 2 | CY7C429 |
| DSP_AD8 | BC7 | 33 | DSP96002 |
| DSP_AD8 | D3 | 6 | CY7C429 |
| DSP_AD9 | BC4 | 12 | P4C164 |
| DSP_AD9 | A2 | 17 | LS245 |
| DSP_AD9 | D3 | 5 | CY7C429 |
| DSP_AD9 | BC7 | 97 | DSP96002 |
| DSP_ARW | A5 | 6 | PAL22V10A |
| DSP_ARW | BC7 | 9 | DSP96002 |
| DSP_AS0 | BC7 | 10 | DSP96002 |
| DSP_AS0 | A5 | 7 | PAL22V10A |
| DSP_AS1 | BC7 | 76 | DSP96002 |
| DSP_AS1 | A5 | 8 | PAL22V10A |
| DSP_ATA~ | A5 | 19 | PAL22V10A |
| DSP_ATA~ | BC7 | 61 | DSP96002 |
| DSP_ATS~ | BC7 | 11 | DSP96002 |
| DSP_BA0 | D12 | 18 | LS244 |
| DSP_BA0 | BC11 | 29 | EPM5128 |
| DSP_BA0 | BC7 | 58 | DSP96002 |
| DSP_BA10 | BC7 | 124 | DSP96002 |
| DSP_BA10 | EF5 | 14 | LS244 |
| DSP_BA10 | BC11 | 66 | EPM5128 |
| DSP_BA11 | EF5 | 12 | LS244 |
| DSP_BA11 | BC7 | 176 | DSP96002 |
| DSP_BA1 | BC7 | 120 | DSP96002 |
| DSP_BA11 | BC11 | 36 | EPM5128 |
| DSP_BA1 | D12 | 16 | LS244 |
| DSP_BA12 | BC11 | 35 | EPM5128 |
| DSP_BA12 | BC7 | 64 | DSP96002 |
| DSP_BA12 | EF5 | 9 | LS244 |
| DSP_BA1 | BC11 | 30 | EPM5128 |
| DSP_BA13 | BC11 | 34 | EPM5128 |
| DSP_BA13 | BC7 | 65 | DSP96002 |
| DSP_BA13 | EF5 | 7 | LS244 |
| DSP_BA14 | BC7 | 125 | DSP96002 |
| DSP_BA14 | BC11 | 48 | EPM5128 |
| DSP_BA14 | EF5 | 5 | LS244 |
| DSP_BA15 | EF5 | 3 | LS244 |
| DSP_BA15 | BC11 | 49 | EPM5128 |
| DSP_BA15 | BC7 | 66 | DSP96002 |
| DSP_BA16 | BC7 | 126 | DSP96002 |
| DSP_BA16 | D11 | 18 | LS244 |
| DSP_BA16 | BC11 | 51 | EPM5128 |
| DSP_BA17 | D11 | 16 | LS244 |
| DSP_BA17 | BC11 | 61 | EPM5128 |
| DSP_BA17 | BC7 | 67 | DSP96002 |
| DSP_BA18 | BC7 | 127 | DSP96002 |
| DSP_BA19 | BC7 | 178 | DSP96002 |
| DSP_BA20 | BC7 | 68 | DSP96002 |
| DSP_BA21 | BC7 | 128 | DSP96002 |
| DSP_BA2 | D12 | 14 | LS244 |
| DSP_BA2 | BC7 | 173 | DSP96002 |
| DSP_BA22 | BC7 | 179 | DSP96002 |
| DSP_BA2 | BC11 | 31 | EPM5128 |
| DSP_BA24 | BC7 | 180 | DSP96002 |
| DSP_BA25 | BC7 | 69 | DSP96002 |
| DSP_BA26 | BC7 | 129 | DSP96002 |

| Signal_name | Physical_location | Pin_number | Part_name |
|---|---|---|---|
| DSP_BA27 | BC7 | 2 | DSP96002 |
| DSP_BA28 | BC7 | 70 | DSP96002 |
| DSP_BA29 | BC7 | 3 | DSP96002 |
| DSP_BA29 | BC11 | 4 | EPM5128 |
| DSP_BA30 | BC7 | 71 | DSP96002 |
| DSP_BA3 | D12 | 12 | LS244 |
| DSP_BA3 | BC11 | 14 | EPM5128 |
| DSP_BA3 | BC7 | 59 | DSP96002 |
| DSP_BA4 | BC11 | 15 | EPM5128 |
| DSP_BA4 | BC7 | 60 | DSP96002 |
| DSP_BA4 | D12 | 9 | LS244 |
| DSP_BA5 | BC7 | 121 | DSP96002 |
| DSP_BA5 | BC11 | 38 | EPM5128 |
| DSP_BA5 | D12 | 7 | LS244 |
| DSP_BA6 | BC7 | 174 | DSP96002 |
| DSP_BA6 | BC11 | 22 | EPM5128 |
| DSP_BA6 | D12 | 5 | LS244 |
| DSP_BA7 | BC7 | 175 | DSP96002 |
| DSP_BA7 | BC11 | 23 | EPM5128 |
| DSP_BA7 | D12 | 3 | LS244 |
| DSP_BA8 | EF5 | 18 | LS244 |
| DSP_BA8 | BC11 | 47 | EPM5128 |
| DSP_BA8 | BC7 | 62 | DSP96002 |
| DSP_BA9 | EF5 | 16 | LS244 |
| DSP_BA9 | BC7 | 63 | DSP96002 |
| DSP_BA9 | BC11 | 68 | EPM5128 |
| DSP_BANK_SEL | H9 | 16 | LS374 |
| DSP_BANK_SEL | A5 | 4 | PAL22V10A |
| DSP_BRW | D11 | 12 | LS244 |
| DSP_BRW | BC11 | 25 | EPM5128 |
| DSP_BRW | BC7 | 56 | DSP96002 |
| DSP_BTA~ | BC11 | 12 | EPM5128 |
| DSP_BTA~ | BC7 | 122 | DSP96002 |
| DSP_BTS~ | BC7 | 117 | DSP96002 |
| DSP_BTS~ | D11 | 14 | LS244 |
| DSP_BTS~ | BC11 | 26 | EPM5128 |
| DSP_D0 | BC7 | 100 | DSP96002 |
| DSP_D0 | L18 | 18 | LS245 |
| DSP_D0 | A7 | 5 | 442512ZFHD |
| DSP_D10 | H15 | 16 | LS245 |
| DSP_D10 | A11 | 3 | 442512ZFHD |
| DSP_D10 | BC7 | 40 | DSP96002 |
| DSP_D11 | H15 | 15 | LS245 |
| DSP_D11 | BC7 | 159 | DSP96002 |
| DSP_D11 | A11 | 26 | 442512ZFHD |
| DSP_D1 | BC7 | 156 | DSP96002 |
| DSP_D1 | L18 | 17 | LS245 |
| DSP_D12 | BC7 | 104 | DSP96002 |
| DSP_D12 | H15 | 14 | LS245 |
| DSP_D1 | A7 | 24 | 442512ZFHD |
| DSP_D12 | A12 | 5 | 442512ZFHD |
| DSP_D13 | H15 | 13 | LS245 |
| DSP_D13 | A12 | 24 | 442512ZFHD |
| DSP_D13 | BC7 | 41 | DSP96002 |
| DSP_D14 | H15 | 12 | LS245 |
| DSP_D14 | BC7 | 160 | DSP96002 |
| DSP_D14 | A12 | 3 | 442512ZFHD |
| DSP_D15 | BC7 | 105 | DSP96002 |
| DSP_D15 | H15 | 11 | LS245 |
| DSP_D15 | A12 | 26 | 442512ZFHD |
| DSP_D1 | BC11 | 6 | EPM5128 |
| DSP_D2 | L18 | 16 | LS245 |
| DSP_D2 | A7 | 3 | 442512ZFHD |
| DSP_D2 | BC7 | 37 | DSP96002 |
| DSP_D2 | BC11 | 7 | EPM5128 |
| DSP_D3 | BC7 | 101 | DSP96002 |
| DSP_D3 | L18 | 15 | LS245 |

| Signal_name | Physical_location | Pin_number | Part_name |
|---|---|---|---|
| DSP_D3 | A7 | 26 | 442512ZFHD |
| DSP_D3 | BC11 | 8 | EPM5128 |
| DSP_D4 | L18 | 14 | LS245 |
| DSP_D4 | BC7 | 157 | DSP96002 |
| DSP_D4 | A8 | 5 | 442512ZFHD |
| DSP_D4 | BC11 | 9 | EPM5128 |
| DSP_D5 | BC11 | 10 | EPM5128 |
| DSP_D5 | L18 | 13 | LS245 |
| DSP_D5 | A8 | 24 | 442512ZFHD |
| DSP_D5 | BC7 | 38 | DSP96002 |
| DSP_D6 | BC7 | 102 | DSP96002 |
| DSP_D6 | BC11 | 11 | EPM5128 |
| DSP_D6 | L18 | 12 | LS245 |
| DSP_D6 | A8 | 3 | 442512ZFHD |
| DSP_D7 | L18 | 11 | LS245 |
| DSP_D7 | BC7 | 158 | DSP96002 |
| DSP_D7 | BC11 | 24 | EPM5128 |
| DSP_D7 | A8 | 26 | 442512ZFHD |
| DSP_D8 | H15 | 18 | LS245 |
| DSP_D8 | BC7 | 39 | DSP96002 |
| DSP_D8 | A11 | 5 | 442512ZFHD |
| DSP_D9 | BC7 | 103 | DSP96002 |
| DSP_D9 | H15 | 17 | LS245 |
| DSP_D9 | A11 | 24 | 442512ZFHD |
| DSP_FIFO_SI~ | A5 | 2 | PAL22V10A |
| DSP_FIFO_SI~ | H6 | 22 | PAL22V10A |
| DSP_FIFO_SO~ | A6 | 2 | PAL22V10A |
| DSP_FIFO_SO~ | H6 | 21 | PAL22V10A |
| DSP_MEM_TEST | H9 | 15 | LS374 |
| DSP_MEM_TEST | A5 | 3 | PAL22V10A |
| DSP_MEM_TEST | EF7 | 6 | PAL22V10A |
| DSP_MEM_WE~ | H6 | 23 | PAL22V10A |
| DSP_MEM_WE~ | BC4 | 27 | P4C164 |
| DSP_RST~ | H9 | 12 | LS374 |
| DSP_RST~ | H3 | 4 | LS00 |
| D_RST~ | EF14 | 12 | LS240 |
| D_RST~ | BC7 | 132 | DSP96002 |
| EM_RST~ | RD8 | 1 | RES |
| EM_RST~ | TP1 | 5 | TPS5 |
| GND | L6 | 1 | LS240 |
| GND | A25 | 109 | CBX |
| GND | BC7 | 111 | DSP96002 |
| GND | BC7 | 12 | DSP96002 |
| GND | A25 | 129 | CBX |
| GND | BC7 | 130 | DSP96002 |
| GND | A25 | 144 | CBX |
| GND | A25 | 15 | CBX |
| GND | BC7 | 164 | DSP96002 |
| GND | BC17 | 18 | EPM5192 |
| GND | BC7 | 181 | DSP96002 |
| GND | BC7 | 182 | DSP96002 |
| GND | BC7 | 183 | DSP96002 |
| GND | BC7 | 187 | DSP96002 |
| GND | BC7 | 189 | DSP96002 |
| GND | L6 | 19 | LS240 |
| GND | BC7 | 190 | DSP96002 |
| GND | BC7 | 191 | DSP96002 |
| GND | BC7 | 192 | DSP96002 |
| GND | BC7 | 193 | DSP96002 |
| GND | BC7 | 194 | DSP96002 |
| GND | BC7 | 196 | DSP96002 |
| GND | BC7 | 197 | DSP96002 |
| GND | TP2 | 2 | TPS5 |
| GND | BC4 | 20 | P4C164 |
| GND | BC7 | 200 | DSP96002 |
| GND | BC7 | 201 | DSP96002 |
| GND | BC7 | 202 | DSP96002 |

| Signal_name | Physical_location | Pin_number | Part_name |
|---|---|---|---|
| GND | BC7 | 203 | DSP96002 |
| GND | BC7 | 204 | DSP96002 |
| GND | BC7 | 205 | DSP96002 |
| GND | BC7 | 209 | DSP96002 |
| GND | BC7 | 211 | DSP96002 |
| GND | BC7 | 212 | DSP96002 |
| GND | BC7 | 213 | DSP96002 |
| GND | BC7 | 214 | DSP96002 |
| GND | BC7 | 215 | DSP96002 |
| GND | BC7 | 216 | DSP96002 |
| GND | BC7 | 219 | DSP96002 |
| GND | BC7 | 222 | DSP96002 |
| GND | BC7 | 223 | DSP96002 |
| GND | A25 | 29 | CBX |
| GND | TP2 | 3 | TPS5 |
| GND | A25 | 37 | CBX |
| GND | BC17 | 39 | EPM5192 |
| GND | TP2 | 4 | TPS5 |
| GND | BC17 | 40 | EPM5192 |
| GND | H1 | 5 | LS125 |
| GND | BC7 | 57 | DSP96002 |
| GND | BC17 | 60 | EPM5192 |
| GND | BC17 | 61 | EPM5192 |
| GND | BC7 | 72 | DSP96002 |
| GND | A25 | 73 | CBX |
| GND | BC17 | 81 | EPM5192 |
| GND | BC17 | 82 | EPM5192 |
| GND | A25 | 86 | CBX |
| GND | BC7 | 94 | DSP96002 |
| H | BC7 | 131 | DSP96002 |
| H | A25 | 142 | CBX |
| H | L3 | 5 | LS244 |
| IF_ACK~ | H5 | 2 | PAL22V10A |
| IF_ACK~ | BC17 | 69 | EPM5192 |
| IF_D10 | F20 | 5 | LS273 |
| IF_D10 | A21 | 7 | 442512ZFHD |
| IF_D11 | A21 | 28 | 442512ZFHD |
| IF_D11 | F20 | 6 | LS273 |
| IF_D1 | F22 | 2 | LS374 |
| IF_D12 | A21 | 2 | 442512ZFHD |
| IF_D1 | F29 | 23 | 442512ZFHD |
| IF_D12 | F20 | 9 | LS273 |
| IF_D2 | A15 | 28 | 442512ZFHD |
| IF_D2 | F22 | 5 | LS374 |
| IF_D2 | F29 | 7 | 442512ZFHD |
| IF_D3 | F29 | 28 | 442512ZFHD |
| IF_D3 | F22 | 6 | LS374 |
| IF_D4 | F29 | 2 | 442512ZFHD |
| IF_D4 | F22 | 9 | LS374 |
| IF_D5 | F22 | 12 | LS374 |
| IF_D5 | F28 | 23 | 442512ZFHD |
| IF_D6 | F22 | 15 | LS374 |
| IF_D6 | F28 | 7 | 442512ZFHD |
| IF_D7 | F22 | 16 | LS374 |
| IF_D7 | F28 | 28 | 442512ZFHD |
| IF_D8 | F22 | 19 | LS374 |
| IF_D8 | F28 | 2 | 442512ZFHD |
| IF_D9 | F20 | 2 | LS273 |
| IF_D9 | A21 | 23 | 442512ZFHD |
| IF_EMPTY | L11 | 2 | LS244 |
| IF_EMPTY | BC17 | 62 | EPM5192 |
| IF_EMPTY | EF24 | 8 | EPM5128 |
| IF_FULL | L11 | 4 | LS244 |
| IF_FULL | EF24 | 64 | EPM5128 |
| IF_FULL | BC17 | 77 | EPM5192 |
| IF_HFULL | L11 | 6 | LS244 |
| IF_HFULL | BC17 | 78 | EPM5192 |

| Signal_name | Physical_location | Pin_number | Part_name |
|---|---|---|---|
| IF_HFULL | H6 | 9 | PAL22V10A |
| IF_OE~ | L19 | 1 | LS244 |
| IF_OE~ | H6 | 17 | PAL22V10A |
| IF_OE~ | H13 | 19 | LS244 |
| IF_OR~ | A25 | 118 | CBX |
| IF_OR~ | EF24 | 65 | EPM5128 |
| IF_OR~ | BC17 | 79 | EPM5192 |
| IF_SI | F22 | 11 | LS374 |
| IF_SI | EF24 | 24 | EPM5128 |
| IF_SI | BC17 | 4 | EPM5192 |
| IF_SI | EF6 | 7 | LS240 |
| IF_SI~ | EF6 | 13 | LS240 |
| IF_SI~ | H5 | 21 | PAL22V10A |
| IF_STR~ | A25 | 119 | CBX |
| IF_STR~ | EF24 | 34 | EPM5128 |
| IF_STR~ | BC17 | 72 | EPM5192 |
| IF_YINC~ | BC17 | 68 | EPM5192 |
| IF_YREQ | BC17 | 71 | EPM5192 |
| INIT~ | L3 | 17 | LS244 |
| INIT~ | H4 | 20 | PAL22V10A |
| INIT~ | L3 | 8 | LS244 |
| INIT~ | | P1 16 | CONNECTOR |
| INLUT10 | H13 | 13 | LS244 |
| INLUT10 | D24 | 16 | LS244 |
| INLUT10 | BC23 | 17 | 7188S-25 |
| INLUT10 | A21 | 24 | 442512ZFHD |
| INLUT1 | BC23 | 1 | 7188S-25 |
| INLUT11 | D24 | 14 | LS244 |
| INLUT11 | H13 | 15 | LS244 |
| INLUT11 | BC23 | 18 | 7188S-25 |
| INLUT11 | A21 | 3 | 442512ZFHD |
| INLUT1 | D23 | 18 | LS244 |
| INLUT1 | L19 | 2 | LS244 |
| INLUT12 | D24 | 12 | LS244 |
| INLUT12 | H13 | 17 | LS244 |
| INLUT12 | BC23 | 19 | 7188S-25 |
| INLUT12 | A21 | 26 | 442512ZFHD |
| INLUT13 | BC23 | 20 | 7188S-25 |
| INLUT13 | D11 | 5 | LS244 |
| INLUT13 | D24 | 9 | LS244 |
| INLUT14 | BC23 | 21 | 7188S-25 |
| INLUT14 | D11 | 3 | LS244 |
| INLUT14 | D24 | 7 | LS244 |
| INLUT1 | F29 | 5 | 442512ZFHD |
| INLUT2 | D23 | 16 | LS244 |
| INLUT2 | BC23 | 2 | 7188S-25 |
| INLUT2 | F29 | 24 | 442512ZFHD |
| INLUT2 | L19 | 4 | LS244 |
| INLUT3 | D23 | 14 | LS244 |
| INLUT3 | F29 | 3 | 442512ZFHD |
| INLUT3 | L19 | 6 | LS244 |
| INLUT4 | D23 | 12 | LS244 |
| INLUT4 | F29 | 26 | 442512ZFHD |
| INLUT4 | BC23 | 4 | 7188S-25 |
| INLUT4 | L19 | 8 | LS244 |
| INLUT5 | L19 | 11 | LS244 |
| INLUT5 | F28 | 5 | 442512ZFHD |
| INLUT5 | D23 | 9 | LS244 |
| INLUT6 | L19 | 13 | LS244 |
| INLUT6 | F28 | 24 | 442512ZFHD |
| INLUT6 | BC23 | 6 | 7188S-25 |
| INLUT6 | D23 | 7 | LS244 |
| INLUT7 | L19 | 15 | LS244 |
| INLUT7 | F28 | 3 | 442512ZFHD |
| INLUT7 | D23 | 5 | LS244 |
| INLUT7 | BC23 | 7 | 7188S-25 |
| INLUT8 | L19 | 17 | LS244 |

| Signal_name | Physical_location | Pin_number | Part_name |
|---|---|---|---|
| INLUT8 | F28 | 26 | 442512ZFHD |
| INLUT8 | D23 | 3 | LS244 |
| INLUT8 | BC23 | 8 | 7188S-25 |
| INLUT9 | H13 | 11 | LS244 |
| INLUT9 | D24 | 18 | LS244 |
| INLUT9 | A21 | 5 | 442512ZFHD |
| INLUT9 | BC23 | 9 | 7188S-25 |
| INT_MASK0 | H8 | 2 | LS374 |
| INT_MASK0 | H6 | 7 | PAL22V10A |
| INT_MASK1 | H8 | 5 | LS374 |
| INT_MASK1 | H6 | 8 | PAL22V10A |
| IN_DATA10 | A25 | 115 | CBX |
| IN_DATA10 | BC25 | 14 | 7188S-25 |
| IN_DATA10 | H14 | 17 | LS245 |
| IN_DATA1 | A25 | 104 | CBX |
| IN_DATA11 | A25 | 116 | CBX |
| IN_DATA11 | BC25 | 15 | 7188S-25 |
| IN_DATA11 | H14 | 16 | LS245 |
| IN_DATA1 | BC23 | 13 | 7188S-25 |
| IN_DATA1 | L17 | 18 | LS245 |
| IN_DATA12 | A25 | 117 | CBX |
| IN_DATA12 | H14 | 15 | LS245 |
| IN_DATA12 | BC25 | 16 | 7188S-25 |
| IN_DATA2 | A25 | 105 | CBX |
| IN_DATA2 | BC23 | 14 | 7188S-25 |
| IN_DATA2 | L17 | 17 | LS245 |
| IN_DATA3 | A25 | 106 | CBX |
| IN_DATA3 | BC23 | 15 | 7188S-25 |
| IN_DATA3 | L17 | 16 | LS245 |
| IN_DATA4 | A25 | 107 | CBX |
| IN_DATA4 | L17 | 15 | LS245 |
| IN_DATA4 | BC23 | 16 | 7188S-25 |
| IN_DATA5 | A25 | 110 | CBX |
| IN_DATA5 | BC24 | 13 | 7188S-25 |
| IN_DATA5 | L17 | 14 | LS245 |
| IN_DATA6 | A25 | 111 | CBX |
| IN_DATA6 | L17 | 13 | LS245 |
| IN_DATA6 | BC24 | 14 | 7188S-25 |
| IN_DATA7 | A25 | 112 | CBX |
| IN_DATA7 | L17 | 12 | LS245 |
| IN_DATA7 | BC24 | 15 | 7188S-25 |
| IN_DATA8 | L17 | 11 | LS245 |
| IN_DATA8 | A25 | 113 | CBX |
| IN_DATA8 | BC24 | 16 | 7188S-25 |
| IN_DATA9 | A25 | 114 | CBX |
| IN_DATA9 | BC25 | 13 | 7188S-25 |
| IN_DATA9 | H14 | 18 | LS245 |
| IORDC~ | L3 | 13 | LS244 |
| IORDC~ | | P1 25 | CONNECTOR |
| IOWDC~ | L3 | 6 | LS244 |
| IOWDC~ | | P1 26 | CONNECTOR |
| IV_ADR0 | L29 | 16 | 442512ZFHD |
| IV_ADR1 | L29 | 13 | 442512ZFHD |
| IV_ADR1 | F26 | 15 | 316B 15 |
| IV_ADR2 | F26 | 14 | 316B 15 |
| IV_ADR2 | L29 | 17 | 442512ZFHD |
| IV_ADR3 | L29 | 12 | 442512ZFHD |
| IV_ADR3 | F26 | 13 | 316B 15 |
| IV_ADR4 | F26 | 12 | 316B 15 |
| IV_ADR4 | L29 | 19 | 442512ZFHD |
| IV_ADR5 | L29 | 10 | 442512ZFHD |
| IV_ADR5 | F26 | 11 | 316B 15 |
| IV_ADR6 | F26 | 10 | 316B 15 |
| IV_ADR6 | L29 | 20 | 442512ZFHD |
| IV_ADR7 | L29 | 18 | 442512ZFHD |
| IV_ADR7 | F26 | 9 | 316B 15 |
| IV_ADR8 | H26 | 16 | 316B 15 |

| Signal_name | Physical_location | Pin_number | Part_name |
|---|---|---|---|
| IV_ADR8 | L29 | 9 | 442512ZFHD |
| IV_CAS~ | H26 | 12 | 316B 15 |
| IV_CAS~ | L29 | 15 | 442512ZFHD |
| IV_RAS~ | H26 | 13 | 316B 15 |
| IV_RAS~ | L29 | 21 | 442512ZFHD |
| IV_SC | H26 | 14 | 316B 15 |
| IV_SC | L29 | 25 | 442512ZFHD |
| IV_SE~ | H6 | 15 | PAL22V10A |
| IV_SE~ | L29 | 27 | 442512ZFHD |
| IV_TRG~ | H26 | 15 | 316B 15 |
| IV_TRG~ | L29 | 6 | 442512ZFHD |
| IV_WE~ | H26 | 11 | 316B 15 |
| IV_WE~ | L29 | 22 | 442512ZFHD |
| L | EF6 | 1 | LS240 |
| L | L8 | 19 | LS640 |
| L | L5 | 3 | LS240 |
| LD_IN1D~ | BC23 | 12 | 7188S-25 |
| LD_IN1D~ | H5 | 17 | PAL22V10A |
| LD_MACRO1~ | L12 | 11 | LS374 |
| LD_MACRO1~ | H4 | 22 | PAL22V10A |
| LD_MACRO2~ | H8 | 11 | LS374 |
| LD_MACRO2~ | H4 | 23 | PAL22V10A |
| LD_NOP10~ | H4 | 17 | PAL22V10A |
| LD_NOP10~ | BC17 | 83 | EPM5192 |
| LD_NOP11~ | H4 | 18 | PAL22V10A |
| LD_NOP11~ | BC17 | 47 | EPM5192 |
| LD_NOP11~ | EF24 | 68 | EPM5128 |
| LD_NOP2~ | H4 | 19 | PAL22V10A |
| LD_NOP2~ | L24 | 66 | EPM5128 |
| LINE_INT1 | L12 | 12 | LS374 |
| LINE_INT1 | EF24 | 36 | EPM5128 |
| LINE_INT1 | BC17 | 43 | EPM5192 |
| LINE_INT2 | L24 | 36 | EPM5128 |
| LINE_INT2 | H9 | 6 | LS374 |
| LOAD | BC23 | 10 | 7188S-25 |
| LOAD | A25 | 141 | CBX |
| LOAD | H9 | 2 | LS374 |
| LOAD | BC4 | 22 | P4C164 |
| LOAD | BC21 | 24 | S128K8 |
| LOAD | EF24 | 25 | EPM5128 |
| LOAD | BC11 | 28 | EPM5128 |
| LOAD | BC17 | 48 | EPM5192 |
| LOAD | A5 | 5 | PAL22V10A |
| LOAD | EF7 | 8 | PAL22V10A |
| LOWER_SI | H17 | 11 | LS374 |
| LOWER_SI | L24 | 26 | EPM5128 |
| LOWER~ | F21 | 1 | LS374 |
| LOWER~ | EF24 | 18 | EPM5128 |
| LOWER~ | BC17 | 22 | EPM5192 |
| LUTADR10 | A25 | 11 | CBX |
| LUTADR10 | D26 | 16 | LS244 |
| LUTADR10 | BC21 | 26 | S128K8 |
| LUTADR11 | A25 | 12 | CBX |
| LUTADR11 | D26 | 14 | LS244 |
| LUTADR1 | BC21 | 12 | S128K8 |
| LUTADR11 | BC21 | 23 | S128K8 |
| LUTADR1 | D25 | 18 | LS244 |
| LUTADR1 | A25 | 2 | CBX |
| LUTADR12 | D26 | 12 | LS244 |
| LUTADR12 | A25 | 13 | CBX |
| LUTADR12 | BC21 | 25 | S128K8 |
| LUTADR13 | A25 | 16 | CBX |
| LUTADR13 | BC21 | 4 | S128K8 |
| LUTADR13 | D26 | 9 | LS244 |
| LUTADR14 | A25 | 17 | CBX |
| LUTADR14 | BC21 | 28 | S128K8 |
| LUTADR14 | D26 | 7 | LS244 |
| LUTADR15 | A25 | 18 | CBX |
| LUTADR15 | BC21 | 3 | S128K8 |

| Signal_name | Physical_location | Pin_number | Part_name |
|---|---|---|---|
| LUTADR15 | D26 | 5 | LS244 |
| LUTADR16 | EF7 | 15 | PAL22V10A |
| LUTADR16 | A25 | 19 | CBX |
| LUTADR16 | BC21 | 31 | S128K8 |
| LUTADR17 | EF7 | 14 | PAL22V10A |
| LUTADR17 | BC21 | 2 | S128K8 |
| LUTADR17 | A25 | 20 | CBX |
| LUTADR2 | BC21 | 11 | S128K8 |
| LUTADR2 | D25 | 16 | LS244 |
| LUTADR2 | A25 | 3 | CBX |
| LUTADR3 | BC21 | 10 | S128K8 |
| LUTADR3 | D25 | 14 | LS244 |
| LUTADR3 | A25 | 4 | CBX |
| LUTADR4 | D25 | 12 | LS244 |
| LUTADR4 | A25 | 5 | CBX |
| LUTADR4 | BC21 | 9 | S128K8 |
| LUTADR5 | A25 | 6 | CBX |
| LUTADR5 | BC21 | 8 | S128K8 |
| LUTADR5 | D25 | 9 | LS244 |
| LUTADR6 | BC21 | 7 | S128K8 |
| LUTADR7 | D25 | 5 | LS244 |
| LUTADR7 | BC21 | 6 | S128K8 |
| LUTADR7 | A25 | 8 | CBX |
| LUTADR8 | D25 | 3 | LS244 |
| LUTADR8 | BC21 | 5 | S128K8 |
| LUTADR8 | A25 | 9 | CBX |
| LUTADR9 | A25 | 10 | CBX |
| LUTADR9 | D26 | 18 | LS244 |
| LUTADR9 | BC21 | 27 | S128K8 |
| LUTCS1~ | EF7 | 22 | PAL22V10A |
| LUTCS2~ | EF7 | 21 | PAL22V10A |
| LUTCS2~ | BC27 | 22 | S128K8 |
| LUTCS3~ | EF7 | 20 | PAL22V10A |
| LUTCS3~ | D21 | 22 | S128K8 |
| LV_ADR0 | D17 | 16 | 316B 15 |
| LV_ADR1 | D15 | 13 | 442512ZFHD |
| LV_ADR1 | D17 | 15 | 316B 15 |
| LV_ADR2 | D17 | 14 | 316B 15 |
| LV_ADR2 | D15 | 17 | 442512ZFHD |
| LV_ADR3 | D15 | 12 | 442512ZFHD |
| LV_ADR3 | D17 | 13 | 316B 15 |
| LV_ADR4 | D17 | 12 | 316B 15 |
| LV_ADR4 | D15 | 19 | 442512ZFHD |
| LV_ADR5 | D15 | 10 | 442512ZFHD |
| LV_ADR5 | D17 | 11 | 316B 15 |
| LV_ADR6 | D17 | 10 | 316B 15 |
| LV_ADR6 | D15 | 20 | 442512ZFHD |
| LV_ADR7 | D15 | 18 | 442512ZFHD |
| LV_ADR7 | D17 | 9 | 316B 15 |
| LV_ADR8 | A16 | 9 | 316B 15 |
| LW_ADR0 | A11 | 16 | 442512ZFHD |
| LW_ADR1 | A11 | 13 | 442512ZFHD |
| LW_ADR1 | A9 | 15 | 316B 15 |
| LW_ADR2 | A9 | 14 | 316B 15 |
| LW_ADR2 | A11 | 17 | 442512ZFHD |
| LW_ADR3 | A11 | 12 | 442512ZFHD |
| LW_ADR3 | A9 | 13 | 316B 15 |
| LW_ADR4 | A9 | 12 | 316B 15 |
| LW_ADR4 | A11 | 19 | 442512ZFHD |
| LW_ADR5 | A11 | 10 | 442512ZFHD |
| LW_ADR5 | A9 | 11 | 316B 15 |
| LW_ADR6 | A9 | 10 | 316B 15 |
| LW_ADR6 | A11 | 20 | 442512ZFHD |
| LW_ADR7 | A11 | 18 | 442512ZFHD |
| LW_ADR7 | A9 | 9 | 316B 15 |
| LW_ADR8 | A10 | 16 | 316B 15 |

| Signal_name | Physical_location | Pin_number | Part_name |
|---|---|---|---|
| LW_ADR8 | A11 | 9 | 442512ZFHD |
| LW_CAS~ | A10 | 12 | 316B 15 |
| LW_CAS~ | A11 | 15 | 442512ZFHD |
| LW_EMPTY | BC11 | 59 | EPM5128 |
| LW_EMPTY | L11 | 8 | LS244 |
| LW_EN | L12 | 2 | LS374 |
| LW_EN | BC17 | 51 | EPM5192 |
| LW_FIFO0 | A1 | 2 | LS244 |
| LW_FIFO0 | BC17 | 6 | EPM5192 |
| LW_FIFO0 | A3 | 9 | CY7C429 |
| LW_FIFO1 | A3 | 10 | CY7C429 |
| LW_FIFO1 | A1 | 4 | LS244 |
| LW_FIFO1 | BC17 | 7 | EPM5192 |
| LW_FIFO2 | A3 | 11 | CY7C429 |
| LW_FIFO2 | A1 | 6 | LS244 |
| LW_FIFO2 | BC17 | 8 | EPM5192 |
| LW_FIFO3 | A3 | 12 | CY7C429 |
| LW_FIFO3 | A1 | 8 | LS244 |
| LW_FIFO3 | BC17 | 9 | EPM5192 |
| LW_FIFO4 | BC17 | 10 | EPM5192 |
| LW_FIFO4 | A1 | 11 | LS244 |
| LW_FIFO4 | A3 | 16 | CY7C429 |
| LW_FIFO5 | BC17 | 11 | EPM5192 |
| LW_FIFO5 | A1 | 13 | LS244 |
| LW_FIFO5 | A3 | 17 | CY7C429 |
| LW_FIFO6 | A1 | 15 | LS244 |
| LW_FIFO6 | A3 | 18 | CY7C429 |
| LW_FIFO6 | BC17 | 31 | EPM5192 |
| LW_FIFO7 | A1 | 17 | LS244 |
| LW_FIFO7 | A3 | 19 | CY7C429 |
| LW_FIFO7 | BC17 | 32 | EPM5192 |
| LW_FIFO_IR | A3 | 8 | CY7C429 |
| LW_FIFO_IR | A5 | 9 | PAL22V10A |
| LW_FIFO_OR | A3 | 21 | CY7C429 |
| LW_FIFO_OR | BC17 | 5 | EPM5192 |
| LW_FIFO_STR~ | BC17 | 46 | EPM5192 |
| LW_FIFO_STR~ | A6 | 7 | PAL22V10A |
| LW_FLG | D15 | 23 | 442512ZFHD |
| LW_FLG | BC17 | 70 | EPM5192 |
| LW_FULL | L11 | 11 | LS244 |
| LW_FULL | BC11 | 60 | EPM5128 |
| LW_HFULL | H6 | 10 | PAL22V10A |
| LW_HFULL | L11 | 13 | LS244 |
| LW_HFULL | BC11 | 64 | EPM5128 |
| LW_RAS~ | A10 | 13 | 316B 15 |
| LW_RAS~ | A11 | 21 | 442512ZFHD |
| LW_RDBK~ | A1 | 1 | LS244 |
| LW_RDBK~ | A1 | 19 | LS244 |
| LW_RDBK~ | A6 | 23 | PAL22V10A |
| LW_SC | A10 | 14 | 316B 15 |
| LW_SC | A11 | 25 | 442512ZFHD |
| LW_SEL0 | L13 | 15 | LS374 |
| LW_SEL0 | EF5 | 17 | LS244 |
| LW_SEL1 | L13 | 16 | LS374 |
| LW_SEL1 | D11 | 2 | LS244 |
| LW_SEL2 | L13 | 19 | LS374 |
| LW_SEL2 | D11 | 4 | LS244 |
| LW_SE~ | A10 | 10 | 316B 15 |
| LW_SE~ | A11 | 27 | 442512ZFHD |
| LW_SI~ | A3 | 1 | CY7C429 |
| LW_SI~ | A5 | 21 | PAL22V10A |
| LW_SI~ | H5 | 23 | PAL22V10A |
| LW_SI~ | BC11 | 27 | EPM5128 |
| LW_SO~ | A3 | 15 | CY7C429 |
| LW_SO~ | A6 | 21 | PAL22V10A |
| LW_STR~ | H4 | 16 | PAL22V10A |

| Signal_name | Physical_location | Pin_number | Part_name |
|---|---|---|---|
| LW_STR~ | L18 | 19 | LS245 |
| LW_STR~ | D11 | 6 | LS244 |
| LW_TRG~ | A10 | 15 | 316B 15 |
| LW_TRG~ | A11 | 6 | 442512ZFHD |
| LW_WE~ | A10 | 11 | 316B 15 |
| LW_WE~ | A11 | 22 | 442512ZFHD |
| L_ADR0 | D17 | 1 | 316B 15 |
| L_ADR0 | BC17 | 27 | EPM5192 |
| L_ADR1 | BC17 | 16 | EPM5192 |
| L_ADR1 | D17 | 2 | 316B 15 |
| L_ADR2 | BC17 | 28 | EPM5192 |
| L_ADR2 | D17 | 3 | 316B 15 |
| L_ADR3 | D17 | 4 | 316B 15 |
| L_ADR3 | BC17 | 49 | EPM5192 |
| L_ADR4 | D17 | 5 | 316B 15 |
| L_ADR4 | BC17 | 50 | EPM5192 |
| L_ADR5 | BC17 | 23 | EPM5192 |
| L_ADR5 | D17 | 6 | 316B 15 |
| L_ADR6 | BC17 | 17 | EPM5192 |
| L_ADR6 | D17 | 7 | 316B 15 |
| L_ADR7 | BC17 | 54 | EPM5192 |
| L_ADR7 | D17 | 8 | 316B 15 |
| L_ADR8 | BC17 | 55 | EPM5192 |
| L_ADR8 | A16 | 8 | 316B 15 |
| MB_A0 | A25 | 123 | CBX |
| MB_A0 | L7 | 18 | LS240 |
| MB_A0 | D23 | 2 | LS244 |
| MB_A0 | H4 | 3 | PAL22V10A |
| MB_A10 | L6 | 14 | LS240 |
| MB_A10 | D26 | 6 | LS244 |
| MB_A10 | H7 | 8 | PAL22V10A |
| MB_A11 | L6 | 12 | LS240 |
| MB_A1 | A25 | 122 | CBX |
| MB_A1 | L7 | 16 | LS240 |
| MB_A11 | D26 | 8 | LS244 |
| MB_A11 | H7 | 9 | PAL22V10A |
| MB_A12 | H7 | 10 | PAL22V10A |
| MB_A12 | D26 | 11 | LS244 |
| MB_A12 | L6 | 9 | LS240 |
| MB_A13 | H7 | 11 | PAL22V10A |
| MB_A13 | D26 | 13 | LS244 |
| MB_A13 | L6 | 7 | LS240 |
| MB_A1 | H4 | 4 | PAL22V10A |
| MB_A14 | H7 | 13 | PAL22V10A |
| MB_A14 | D26 | 15 | LS244 |
| MB_A14 | L6 | 5 | LS240 |
| MB_A15 | H5 | 3 | PAL22V10A |
| MB_A16 | L5 | 18 | LS240 |
| MB_A16 | H5 | 4 | PAL22V10A |
| MB_A17 | L5 | 16 | LS240 |
| MB_A17 | H5 | 5 | PAL22V10A |
| MB_A18 | L5 | 14 | LS240 |
| MB_A18 | H5 | 6 | PAL22V10A |
| MB_A19 | L5 | 12 | LS240 |
| MB_A19 | H5 | 7 | PAL22V10A |
| MB_A20 | H5 | 8 | PAL22V10A |
| MB_A20 | L5 | 9 | LS240 |
| MB_A2 | A25 | 121 | CBX |
| MB_A2 | L7 | 14 | LS240 |
| MB_A21 | L5 | 7 | LS240 |
| MB_A21 | H5 | 9 | PAL22V10A |
| MB_A22 | H5 | 10 | PAL22V10A |
| MB_A22 | L5 | 5 | LS240 |
| MB_A2 | H4 | 5 | PAL22V10A |
| MB_A2 | D23 | 6 | LS244 |
| MB_A3 | L7 | 12 | LS240 |
| MB_A3 | A25 | 120 | CBX |

| Signal_name | Physical_location | Pin_number | Part_name |
|---|---|---|---|
| MB_A3 | H4 | 6 | PAL22V10A |
| MB_A3 | D23 | 8 | LS244 |
| MB_A4 | D23 | 11 | LS244 |
| MB_A4 | H7 | 2 | PAL22V10A |
| MB_A4 | H4 | 7 | PAL22V10A |
| MB_A4 | L7 | 9 | LS240 |
| MB_A5 | D23 | 13 | LS244 |
| MB_A5 | H7 | 3 | PAL22V10A |
| MB_A5 | L7 | 7 | LS240 |
| MB_A5 | H4 | 8 | PAL22V10A |
| MB_A6 | D23 | 15 | LS244 |
| MB_A6 | H7 | 4 | PAL22V10A |
| MB_A6 | L7 | 5 | LS240 |
| MB_A6 | H4 | 9 | PAL22V10A |
| MB_A7 | D23 | 17 | LS244 |
| MB_A7 | L7 | 3 | LS240 |
| MB_A7 | H7 | 5 | PAL22V10A |
| MB_A8 | L6 | 18 | LS240 |
| MB_A8 | D26 | 2 | LS244 |
| MB_A8 | H7 | 6 | PAL22V10A |
| MB_A9 | L6 | 16 | LS240 |
| MB_A9 | D26 | 4 | LS244 |
| MB_A9 | H7 | 7 | PAL22V10A |
| MB_D0 | L11 | 18 | LS244 |
| MB_D0 | L14 | 2 | LS245 |
| MB_D0 | A7 | 23 | 442512ZFHD |
| MB_D0 | EF24 | 26 | EPM5128 |
| MB_D0 | L12 | 3 | LS374 |
| MB_D0 | L24 | 38 | EPM5128 |
| MB_D0 | EF17 | 52 | EPM5128 |
| MB_D0 | A25 | 87 | CBX |
| MB_D10 | EF8 | 13 | PAL22V10A |
| MB_D10 | H10 | 14 | LS244 |
| MB_D10 | L8 | 16 | LS640 |
| MB_D10 | A11 | 28 | 442512ZFHD |
| MB_D10 | H11 | 4 | LS245 |
| MB_D10 | H13 | 5 | LS244 |
| MB_D10 | EF24 | 58 | EPM5128 |
| MB_D10 | H13 | 6 | LS244 |
| MB_D10 | L24 | 62 | EPM5128 |
| MB_D10 | H9 | 7 | LS374 |
| MB_D10 | A25 | 97 | CBX |
| MB_D11 | H10 | 12 | LS244 |
| MB_D11 | L8 | 15 | LS640 |
| MB_D11 | A11 | 2 | 442512ZFHD |
| MB_D11 | EF8 | 23 | PAL22V10A |
| MB_D11 | H13 | 3 | LS244 |
| MB_D11 | H11 | 5 | LS245 |
| MB_D11 | EF24 | 59 | EPM5128 |
| MB_D1 | L11 | 16 | LS244 |
| MB_D11 | L24 | 63 | EPM5128 |
| MB_D1 | L10 | 17 | LS640 |
| MB_D11 | H9 | 8 | LS374 |
| MB_D11 | H16 | 9 | LS374 |
| MB_D11 | A25 | 98 | CBX |
| MB_D12 | H16 | 12 | LS374 |
| MB_D12 | H9 | 13 | LS374 |
| MB_D12 | L8 | 14 | LS640 |
| MB_D12 | EF8 | 22 | PAL22V10A |
| MB_D12 | A12 | 23 | 442512ZFHD |
| MB_D12 | H11 | 6 | LS245 |
| MB_D12 | EF24 | 60 | EPM5128 |
| MB_D12 | L24 | 64 | EPM5128 |
| MB_D1 | EF24 | 27 | EPM5128 |
| MB_D12 | H10 | 9 | LS244 |
| MB_D12 | A25 | 99 | CBX |

| Signal_name | Physical_location | Pin_number | Part_name |
|---|---|---|---|
| MB_D1 | L14 | 3 | LS245 |
| MB_D13 | A25 | 100 | CBX |
| MB_D13 | L8 | 13 | LS640 |
| MB_D13 | H9 | 14 | LS374 |
| MB_D13 | H16 | 15 | LS374 |
| MB_D13 | EF8 | 21 | PAL22V10A |
| MB_D13 | EF24 | 61 | EPM5128 |
| MB_D13 | L24 | 65 | EPM5128 |
| MB_D13 | H10 | 7 | LS244 |
| MB_D1 | L24 | 39 | EPM5128 |
| MB_D1 | L12 | 4 | LS374 |
| MB_D14 | A25 | 101 | CBX |
| MB_D14 | L8 | 12 | LS640 |
| MB_D14 | H16 | 16 | LS374 |
| MB_D14 | H9 | 17 | LS374 |
| MB_D14 | EF8 | 20 | PAL22V10A |
| MB_D14 | A12 | 28 | 442512ZFHD |
| MB_D14 | L24 | 46 | EPM5128 |
| MB_D14 | H10 | 5 | LS244 |
| MB_D14 | EF24 | 62 | EPM5128 |
| MB_D14 | H11 | 8 | LS245 |
| MB_D1 | H17 | 5 | LS374 |
| MB_D15 | L8 | 11 | LS640 |
| MB_D15 | H9 | 18 | LS374 |
| MB_D15 | H16 | 19 | LS374 |
| MB_D15 | A12 | 2 | 442512ZFHD |
| MB_D15 | H10 | 3 | LS244 |
| MB_D15 | EF24 | 46 | EPM5128 |
| MB_D15 | L24 | 47 | EPM5128 |
| MB_D15 | H11 | 9 | LS245 |
| MB_D1 | A7 | 7 | 442512ZFHD |
| MB_D1 | A25 | 88 | CBX |
| MB_D2 | L11 | 14 | LS244 |
| MB_D2 | L10 | 16 | LS640 |
| MB_D2 | A7 | 28 | 442512ZFHD |
| MB_D2 | EF24 | 38 | EPM5128 |
| MB_D2 | L14 | 4 | LS245 |
| MB_D2 | L24 | 40 | EPM5128 |
| MB_D2 | EF17 | 55 | EPM5128 |
| MB_D2 | L16 | 6 | LS244 |
| MB_D2 | L12 | 7 | LS374 |
| MB_D2 | A25 | 89 | CBX |
| MB_D3 | L11 | 12 | LS244 |
| MB_D3 | L10 | 15 | LS640 |
| MB_D3 | A7 | 2 | 442512ZFHD |
| MB_D3 | EF24 | 39 | EPM5128 |
| MB_D3 | L24 | 41 | EPM5128 |
| MB_D3 | L14 | 5 | LS245 |
| MB_D3 | EF17 | 56 | EPM5128 |
| MB_D3 | L12 | 8 | LS374 |
| MB_D3 | H17 | 9 | LS374 |
| MB_D3 | A25 | 90 | CBX |
| MB_D4 | L16 | 11 | LS244 |
| MB_D4 | H17 | 12 | LS374 |
| MB_D4 | L12 | 13 | LS374 |
| MB_D4 | L10 | 14 | LS640 |
| MB_D4 | A8 | 23 | 442512ZFHD |
| MB_D4 | EF24 | 40 | EPM5128 |
| MB_D4 | L24 | 42 | EPM5128 |
| MB_D4 | EF17 | 57 | EPM5128 |
| MB_D4 | L14 | 6 | LS245 |
| MB_D4 | L11 | 9 | LS244 |
| MB_D4 | A25 | 91 | CBX |
| MB_D5 | L10 | 13 | LS640 |
| MB_D5 | L12 | 14 | LS374 |
| MB_D5 | H17 | 15 | LS374 |

| Signal_name | Physical_location | Pin_number | Part_name |
|---|---|---|---|
| MB_D5 | EF17 | 18 | EPM5128 |
| MB_D5 | EF24 | 41 | EPM5128 |
| MB_D5 | L24 | 43 | EPM5128 |
| MB_D5 | L11 | 7 | LS244 |
| MB_D5 | A25 | 92 | CBX |
| MB_D6 | L10 | 12 | LS640 |
| MB_D6 | L16 | 15 | LS244 |
| MB_D6 | H17 | 16 | LS374 |
| MB_D6 | L12 | 17 | LS374 |
| MB_D6 | EF17 | 19 | EPM5128 |
| MB_D6 | A8 | 28 | 442512ZFHD |
| MB_D6 | EF24 | 42 | EPM5128 |
| MB_D6 | L11 | 5 | LS244 |
| MB_D6 | L24 | 58 | EPM5128 |
| MB_D6 | L14 | 8 | LS245 |
| MB_D6 | A25 | 93 | CBX |
| MB_D7 | L10 | 11 | LS640 |
| MB_D7 | L16 | 17 | LS244 |
| MB_D7 | L12 | 18 | LS374 |
| MB_D7 | H17 | 19 | LS374 |
| MB_D7 | A8 | 2 | 442512ZFHD |
| MB_D7 | EF17 | 21 | EPM5128 |
| MB_D7 | L11 | 3 | LS244 |
| MB_D7 | EF24 | 43 | EPM5128 |
| MB_D7 | L24 | 59 | EPM5128 |
| MB_D7 | L14 | 9 | LS245 |
| MB_D7 | A25 | 94 | CBX |
| MB_D8 | EF8 | 10 | PAL22V10A |
| MB_D8 | L8 | 18 | LS640 |
| MB_D8 | H11 | 2 | LS245 |
| MB_D8 | EF17 | 22 | EPM5128 |
| MB_D8 | A11 | 23 | 442512ZFHD |
| MB_D8 | H9 | 3 | LS374 |
| MB_D8 | EF24 | 44 | EPM5128 |
| MB_D8 | L24 | 60 | EPM5128 |
| MB_D8 | H13 | 9 | LS244 |
| MB_D8 | A25 | 95 | CBX |
| MB_D9 | EF8 | 11 | PAL22V10A |
| MB_D9 | H10 | 16 | LS244 |
| MB_D9 | L8 | 17 | LS640 |
| MB_D9 | H11 | 3 | LS245 |
| MB_D9 | H9 | 4 | LS374 |
| MB_D9 | EF24 | 45 | EPM5128 |
| MB_D9 | H16 | 5 | LS374 |
| MB_D9 | L24 | 61 | EPM5128 |
| MB_D9 | H13 | 7 | LS244 |
| MB_D9 | A25 | 96 | CBX |
| MB_READ | EF6 | 3 | LS240 |
| MB_READ | D11 | 8 | LS244 |
| MB_READ~ | L8 | 1 | LS640 |
| MB_READ~ | EF6 | 17 | LS240 |
| MB_READ~ | H7 | 18 | PAL22V10A |
| MB_READ~ | EF7 | 9 | PAL22V10A |
| MEM_TEST | H9 | 5 | LS374 |
| MEM_TEST | EF7 | 7 | PAL22V10A |
| MRDC~ | L3 | 2 | LS244 |
| MRDC~ | | P1 23 | CONNECTOR |
| MRD~ | H5 | 15 | PAL22V10A |
| MRD~ | H7 | 16 | PAL22V10A |
| MRD~ | H6 | 20 | PAL22V10A |
| MRG0 | BC1 | 2 | LS244 |
| MRG0 | BC3 | 9 | CY7C429 |
| MRG10 | D3 | 11 | CY7C429 |
| MRG10 | D1 | 6 | LS244 |
| MRG1 | BC3 | 10 | CY7C429 |
| MRG11 | D3 | 12 | CY7C429 |
| MRG11 | D1 | 8 | LS244 |

| Signal_name | Physical_location | Pin_number | Part_name |
|---|---|---|---|
| MRG12 | D1 | 11 | LS244 |
| MRG12 | D3 | 16 | CY7C429 |
| MRG13 | D1 | 13 | LS244 |
| MRG13 | D3 | 17 | CY7C429 |
| MRG1 | BC1 | 4 | LS244 |
| MRG14 | D1 | 15 | LS244 |
| MRG14 | D3 | 18 | CY7C429 |
| MRG15 | D1 | 17 | LS244 |
| MRG15 | D3 | 19 | CY7C429 |
| MRG2 | BC3 | 11 | CY7C429 |
| MRG2 | BC1 | 6 | LS244 |
| MRG3 | BC3 | 12 | CY7C429 |
| MRG3 | BC1 | 8 | LS244 |
| MRG4 | BC1 | 11 | LS244 |
| MRG4 | BC3 | 16 | CY7C429 |
| MRG5 | BC1 | 13 | LS244 |
| MRG5 | BC3 | 17 | CY7C429 |
| MRG6 | BC1 | 15 | LS244 |
| MRG6 | BC3 | 18 | CY7C429 |
| MRG7 | BC1 | 17 | LS244 |
| MRG7 | BC3 | 19 | CY7C429 |
| MRG8 | D1 | 2 | LS244 |
| MRG8 | D3 | 9 | CY7C429 |
| MRG9 | D3 | 10 | CY7C429 |
| MRG9 | D1 | 4 | LS244 |
| MRG_FIFO_IR | A5 | 10 | PAL22V10A |
| MRG_FIFO_IR | BC3 | 8 | CY7C429 |
| MRG_RDBK~ | BC1 | 1 | LS244 |
| MRG_RDBK~ | BC1 | 19 | LS244 |
| MRG_RDBK~ | A6 | 22 | PAL22V10A |
| MRG_SI~ | BC3 | 1 | CY7C429 |
| MRG_SI~ | A5 | 20 | PAL22V10A |
| MRG_SO~ | BC3 | 15 | CY7C429 |
| MRG_SO~ | A6 | 20 | PAL22V10A |
| MUX_OE~ | EF17 | 15 | EPM5128 |
| MUX_OE~ | H6 | 16 | PAL22V10A |
| MWDC~ | L3 | 4 | LS244 |
| MWDC~ | | P1 24 | CONNECTOR |
| ODD_ADD | EF24 | 47 | EPM5128 |
| ODD_ADD | L24 | 48 | EPM5128 |
| ODD_ADD | BC17 | 74 | EPM5192 |
| ODD_ADD | L12 | 9 | LS374 |
| OF_D10 | H18 | 4 | LS374 |
| OF_D10 | L21 | 7 | 442512ZFHD |
| OF_D11 | L21 | 28 | 442512ZFHD |
| OF_D11 | H18 | 7 | LS374 |
| OF_D12 | L21 | 2 | 442512ZFHD |
| OF_D1 | L20 | 23 | 442512ZFHD |
| OF_D12 | H18 | 8 | LS374 |
| OF_D1 | H16 | 3 | LS374 |
| OF_D2 | H16 | 4 | LS374 |
| OF_D2 | L20 | 7 | 442512ZFHD |
| OF_D3 | L20 | 28 | 442512ZFHD |
| OF_D3 | H16 | 7 | LS374 |
| OF_D4 | L20 | 2 | 442512ZFHD |
| OF_D4 | H16 | 8 | LS374 |
| OF_D5 | H16 | 13 | LS374 |
| OF_D5 | L22 | 23 | 442512ZFHD |
| OF_D6 | H16 | 14 | LS374 |
| OF_D6 | L22 | 7 | 442512ZFHD |
| OF_D7 | H16 | 17 | LS374 |
| OF_D7 | L22 | 28 | 442512ZFHD |
| OF_D8 | H16 | 18 | LS374 |
| OF_D8 | L22 | 2 | 442512ZFHD |
| OF_D9 | L21 | 23 | 442512ZFHD |
| OF_D9 | H18 | 3 | LS374 |

| Signal_name | Physical_location | Pin_number | Part_name |
|---|---|---|---|
| OF_EMPTY | L11 | 15 | LS244 |
| OF_EMPTY | L24 | 7 | EPM5128 |
| OF_FULL | L11 | 17 | LS244 |
| OF_FULL | L24 | 52 | EPM5128 |
| OF_IR~ | L24 | 56 | EPM5128 |
| OF_IR~ | A25 | 84 | CBX |
| OF_SO | H3 | 10 | LS00 |
| OF_SO | H3 | 13 | LS00 |
| OF_SO | EF6 | 5 | LS240 |
| OF_SO~ | H17 | 1 | LS374 |
| OF_SO~ | EF6 | 15 | LS240 |
| OF_SO~ | H5 | 18 | PAL22V10A |
| OF_SO~ | L24 | 24 | EPM5128 |
| OF_STR~ | L24 | 34 | EPM5128 |
| OF_STR~ | A25 | 83 | CBX |
| ORDER0 | EF17 | 32 | EPM5128 |
| ORDER0 | BC17 | 64 | EPM5192 |
| ORDER1 | EF17 | 2 | EPM5128 |
| ORDER1 | BC17 | 65 | EPM5192 |
| ORDER2 | EF17 | 1 | EPM5128 |
| ORDER2 | BC17 | 67 | EPM5192 |
| OS0 | TP1 | 1 | TPS5 |
| OS0 | BC7 | 51 | DSP96002 |
| OS1 | BC7 | 114 | DSP96002 |
| OS1 | TP1 | 3 | TPS5 |
| OUT_DATA10 | H13 | 16 | LS244 |
| OUT_DATA10 | L21 | 24 | 442512ZFHD |
| OUT_DATA10 | A25 | 79 | CBX |
| OUT_DATA11 | H13 | 14 | LS244 |
| OUT_DATA11 | L21 | 3 | 442512ZFHD |
| OUT_DATA1 | L16 | 18 | LS244 |
| OUT_DATA11 | A25 | 80 | CBX |
| OUT_DATA12 | H13 | 12 | LS244 |
| OUT_DATA12 | L21 | 26 | 442512ZFHD |
| OUT_DATA12 | A25 | 81 | CBX |
| OUT_DATA1 | L20 | 5 | 442512ZFHD |
| OUT_DATA1 | A25 | 68 | CBX |
| OUT_DATA2 | L16 | 16 | LS244 |
| OUT_DATA2 | L20 | 24 | 442512ZFHD |
| OUT_DATA2 | A25 | 69 | CBX |
| OUT_DATA3 | L16 | 14 | LS244 |
| OUT_DATA3 | L20 | 3 | 442512ZFHD |
| OUT_DATA3 | A25 | 70 | CBX |
| OUT_DATA4 | L16 | 12 | LS244 |
| OUT_DATA4 | L20 | 26 | 442512ZFHD |
| OUT_DATA4 | A25 | 71 | CBX |
| OUT_DATA5 | L22 | 5 | 442512ZFHD |
| OUT_DATA5 | A25 | 74 | CBX |
| OUT_DATA5 | L16 | 9 | LS244 |
| OUT_DATA6 | L22 | 24 | 442512ZFHD |
| OUT_DATA6 | L16 | 7 | LS244 |
| OUT_DATA6 | A25 | 75 | CBX |
| OUT_DATA7 | L22 | 3 | 442512ZFHD |
| OUT_DATA7 | L16 | 5 | LS244 |
| OUT_DATA7 | A25 | 76 | CBX |
| OUT_DATA8 | L22 | 26 | 442512ZFHD |
| OUT_DATA8 | L16 | 3 | LS244 |
| OUT_DATA8 | A25 | 77 | CBX |
| OUT_DATA9 | H13 | 18 | LS244 |
| OUT_DATA9 | L21 | 5 | 442512ZFHD |
| OUT_DATA9 | A25 | 78 | CBX |
| OV_ADR0 | L20 | 16 | 442512ZFHD |
| OV_ADR1 | L20 | 13 | 442512ZFHD |
| OV_ADR1 | H24 | 15 | 316B 15 |
| OV_ADR2 | H24 | 14 | 316B 15 |
| OV_ADR2 | L20 | 17 | 442512ZFHD |

| Signal_name | Physical_location | Pin_number | Part_name |
|---|---|---|---|
| OV_ADR3 | L20 | 12 | 442512ZFHD |
| OV_ADR3 | H24 | 13 | 316B 15 |
| OV_ADR4 | H24 | 12 | 316B 15 |
| OV_ADR4 | L20 | 19 | 442512ZFHD |
| OV_ADR5 | L20 | 10 | 442512ZFHD |
| OV_ADR5 | H24 | 11 | 316B 15 |
| OV_ADR6 | H24 | 10 | 316B 15 |
| OV_ADR6 | L20 | 20 | 442512ZFHD |
| OV_ADR7 | L20 | 18 | 442512ZFHD |
| OV_ADR7 | H24 | 9 | 316B 15 |
| OV_ADR8 | H25 | 16 | 316B 15 |
| OV_ADR8 | L20 | 9 | 442512ZFHD |
| OV_CAS~ | H25 | 11 | 316B 15 |
| OV_CAS~ | L20 | 15 | 442512ZFHD |
| OV_RAS~ | H25 | 12 | 316B 15 |
| OV_RAS~ | L20 | 21 | 442512ZFHD |
| OV_SC | H25 | 14 | 316B 15 |
| OV_SC | L20 | 25 | 442512ZFHD |
| OV_SE~ | H25 | 13 | 316B 15 |
| OV_SE~ | L20 | 27 | 442512ZFHD |
| OV_TRG~ | H25 | 15 | 316B 15 |
| OV_TRG~ | L20 | 6 | 442512ZFHD |
| OV_WE~ | H25 | 10 | 316B 15 |
| OV_WE~ | L20 | 22 | 442512ZFHD |
| RDBK0~ | L17 | 1 | LS245 |
| RDBK0~ | EF7 | 23 | PAL22V10A |
| RDBK | H6 | 11 | PAL22V10A |
| RDBK | EF6 | 12 | LS240 |
| RDBK | D11 | 19 | LS244 |
| RDBK1~ | L9 | 1 | LS245 |
| RDBK1~ | EF7 | 18 | PAL22V10A |
| RDBK2~ | L15 | 1 | LS245 |
| RDBK2~ | EF7 | 17 | PAL22V10A |
| RDBK3~ | L14 | 1 | LS245 |
| RDBK3~ | EF7 | 16 | PAL22V10A |
| RDBK4~ | A2 | 1 | LS245 |
| RDBK4~ | A5 | 18 | PAL22V10A |
| RDBK5~ | D2 | 1 | LS245 |
| RDBK5~ | A5 | 17 | PAL22V10A |
| RDBK~ | D23 | 1 | LS244 |
| RDBK~ | EF7 | 19 | PAL22V10A |
| RDBK~ | EF6 | 8 | LS240 |
| RD_STATUS~ | L11 | 1 | LS244 |
| RD_STATUS~ | H7 | 17 | PAL22V10A |
| RD_STATUS~ | L11 | 19 | LS244 |
| REF_ON~ | L24 | 49 | EPM5128 |
| REF_ON~ | BC11 | 52 | EPM5128 |
| REF_ON~ | BC17 | 59 | EPM5192 |
| REF_ON~ | EF24 | 63 | EPM5128 |
| RST~ | A25 | 130 | CBX |
| RST~ | BC17 | 2 | EPM5192 |
| RST~ | A3 | 22 | CY7C429 |
| RST~ | L3 | 3 | LS244 |
| RST~ | BC11 | 32 | EPM5128 |
| RST~ | EF24 | 35 | EPM5128 |
| SBANK_CS1 | A5 | 23 | PAL22V10A |
| SBANK_CS1 | BC4 | 26 | P4C164 |
| SBANK_CS2 | A5 | 22 | PAL22V10A |
| SBANK_CS2 | D4 | 26 | P4C164 |
| SP_DATA00 | A22 | 2 | LS244 |
| SP_DATA00 | A19 | 5 | 442512ZFHD |
| SP_DATA00 | EF17 | 68 | EPM5128 |
| SP_DATA01 | A19 | 24 | 442512ZFHD |
| SP_DATA01 | A22 | 4 | LS244 |
| SP_DATA01 | EF17 | 66 | EPM5128 |
| SP_DATA02 | A19 | 3 | 442512ZFHD |

| Signal_name | Physical_location | Pin_number | Part_name |
|---|---|---|---|
| SP_DATA02 | EF17 | 36 | EPM5128 |
| SP_DATA02 | A22 | 6 | LS244 |
| SP_DATA03 | A19 | 26 | 442512ZFHD |
| SP_DATA03 | EF17 | 35 | EPM5128 |
| SP_DATA03 | A22 | 8 | LS244 |
| SP_DATA04 | A22 | 11 | LS244 |
| SP_DATA04 | EF17 | 34 | EPM5128 |
| SP_DATA04 | A20 | 5 | 442512ZFHD |
| SP_DATA05 | A22 | 13 | LS244 |
| SP_DATA05 | A20 | 24 | 442512ZFHD |
| SP_DATA05 | EF17 | 4 | EPM5128 |
| SP_DATA06 | A22 | 15 | LS244 |
| SP_DATA06 | A20 | 3 | 442512ZFHD |
| SP_DATA06 | EF17 | 5 | EPM5128 |
| SP_DATA07 | A22 | 17 | LS244 |
| SP_DATA07 | A20 | 26 | 442512ZFHD |
| SP_DATA07 | EF17 | 6 | EPM5128 |
| SP_DATA08 | D20 | 5 | 442512ZFHD |
| SP_DATA08 | EF17 | 7 | EPM5128 |
| SP_DATA10 | A18 | 5 | 442512ZFHD |
| SP_DATA10 | EF17 | 8 | EPM5128 |
| SP_DATA11 | A18 | 24 | 442512ZFHD |
| SP_DATA11 | EF17 | 9 | EPM5128 |
| SP_DATA12 | EF17 | 10 | EPM5128 |
| SP_DATA12 | A18 | 3 | 442512ZFHD |
| SP_DATA13 | EF17 | 11 | EPM5128 |
| SP_DATA13 | A18 | 26 | 442512ZFHD |
| SP_DATA14 | EF17 | 24 | EPM5128 |
| SP_DATA14 | BC20 | 5 | 442512ZFHD |
| SP_DATA15 | BC20 | 24 | 442512ZFHD |
| SP_DATA15 | EF17 | 25 | EPM5128 |
| SP_DATA16 | EF17 | 26 | EPM5128 |
| SP_DATA16 | BC20 | 3 | 442512ZFHD |
| SP_DATA17 | BC20 | 26 | 442512ZFHD |
| SP_DATA17 | EF17 | 27 | EPM5128 |
| SP_DATA18 | EF17 | 28 | EPM5128 |
| SP_DATA18 | D19 | 5 | 442512ZFHD |
| SP_DATA20 | EF17 | 29 | EPM5128 |
| SP_DATA20 | A13 | 5 | 442512ZFHD |
| SP_DATA21 | A13 | 24 | 442512ZFHD |
| SP_DATA21 | EF17 | 30 | EPM5128 |
| SP_DATA22 | A13 | 3 | 442512ZFHD |
| SP_DATA22 | EF17 | 31 | EPM5128 |
| SP_DATA23 | A13 | 26 | 442512ZFHD |
| SP_DATA23 | EF17 | 38 | EPM5128 |
| SP_DATA24 | EF17 | 39 | EPM5128 |
| SP_DATA24 | BC19 | 5 | 442512ZFHD |
| SP_DATA25 | BC19 | 24 | 442512ZFHD |
| SP_DATA25 | EF17 | 40 | EPM5128 |
| SP_DATA26 | BC19 | 3 | 442512ZFHD |
| SP_DATA26 | EF17 | 41 | EPM5128 |
| SP_DATA27 | BC19 | 26 | 442512ZFHD |
| SP_DATA27 | EF17 | 42 | EPM5128 |
| SP_DATA28 | EF17 | 43 | EPM5128 |
| SP_DATA28 | D15 | 5 | 442512ZFHD |
| SP_DATA30 | EF17 | 44 | EPM5128 |
| SP_DATA30 | A14 | 5 | 442512ZFHD |
| SP_DATA31 | A14 | 24 | 442512ZFHD |
| SP_DATA31 | EF17 | 45 | EPM5128 |
| SP_DATA32 | A14 | 3 | 442512ZFHD |
| SP_DATA32 | EF17 | 58 | EPM5128 |
| SP_DATA33 | A14 | 26 | 442512ZFHD |
| SP_DATA33 | EF17 | 59 | EPM5128 |
| SP_DATA34 | BC14 | 5 | 442512ZFHD |
| SP_DATA34 | EF17 | 60 | EPM5128 |
| SP_DATA35 | BC14 | 24 | 442512ZFHD |
| SP_DATA35 | EF17 | 61 | EPM5128 |

| Signal_name | Physical_location | Pin_number | Part_name |
|---|---|---|---|
| SP_DATA36 | BC14 | 3 | 442512ZFHD |
| SP_DATA36 | EF17 | 62 | EPM5128 |
| SP_DATA37 | BC14 | 26 | 442512ZFHD |
| SP_DATA37 | EF17 | 63 | EPM5128 |
| SP_DATA38 | D14 | 5 | 442512ZFHD |
| SP_DATA38 | EF17 | 64 | EPM5128 |
| SP_DATA40 | A15 | 5 | 442512ZFHD |
| SP_DATA40 | EF17 | 65 | EPM5128 |
| SP_DATA41 | A15 | 24 | 442512ZFHD |
| SP_DATA41 | EF17 | 46 | EPM5128 |
| SP_DATA42 | A15 | 3 | 442512ZFHD |
| SP_DATA42 | EF17 | 47 | EPM5128 |
| SP_DATA43 | A15 | 26 | 442512ZFHD |
| SP_DATA43 | EF17 | 48 | EPM5128 |
| SP_DATA44 | EF17 | 49 | EPM5128 |
| SP_DATA44 | BC13 | 5 | 442512ZFHD |
| SP_DATA45 | BC13 | 24 | 442512ZFHD |
| SP_DATA45 | EF17 | 51 | EPM5128 |
| SP_DATA46 | EF17 | 12 | EPM5128 |
| SP_DATA46 | BC13 | 3 | 442512ZFHD |
| SP_DATA47 | EF17 | 13 | EPM5128 |
| SP_DATA47 | BC13 | 26 | 442512ZFHD |
| SP_DATA48 | EF17 | 14 | EPM5128 |
| SP_DATA48 | D13 | 5 | 442512ZFHD |
| SP_SEL | H6 | 13 | PAL22V10A |
| SP_SEL | H9 | 19 | LS374 |
| SP_SEL | EF6 | 4 | LS240 |
| SP_SEL | EF24 | 5 | EPM5128 |
| SP_SEL~ | BC17 | 15 | EPM5192 |
| SP_SEL~ | EF6 | 16 | LS240 |
| SV_ADR0 | A21 | 16 | 442512ZFHD |
| SV_ADR1 | A21 | 13 | 442512ZFHD |
| SV_ADR1 | A17 | 15 | 316B 15 |
| SV_ADR2 | A17 | 14 | 316B 15 |
| SV_ADR2 | A21 | 17 | 442512ZFHD |
| SV_ADR3 | A21 | 12 | 442512ZFHD |
| SV_ADR3 | A17 | 13 | 316B 15 |
| SV_ADR4 | A17 | 12 | 316B 15 |
| SV_ADR4 | A21 | 19 | 442512ZFHD |
| SV_ADR5 | A21 | 10 | 442512ZFHD |
| SV_ADR5 | A17 | 11 | 316B 15 |
| SV_ADR6 | A17 | 10 | 316B 15 |
| SV_ADR6 | A21 | 20 | 442512ZFHD |
| SV_ADR7 | A21 | 18 | 442512ZFHD |
| SV_ADR7 | A17 | 9 | 316B 15 |
| SV_ADR8 | A16 | 16 | 316B 15 |
| SV_ADR8 | A21 | 9 | 442512ZFHD |
| SV_CAS~ | A16 | 12 | 316B 15 |
| SV_CAS~ | A21 | 15 | 442512ZFHD |
| SV_RAS0~ | D18 | 16 | 316B 15 |
| SV_RAS0~ | A21 | 21 | 442512ZFHD |
| SV_RAS1~ | D18 | 15 | 316B 15 |
| SV_RAS1~ | A18 | 21 | 442512ZFHD |
| SV_RAS2~ | D18 | 14 | 316B 15 |
| SV_RAS2~ | BC19 | 21 | 442512ZFHD |
| SV_RAS3~ | D18 | 13 | 316B 15 |
| SV_RAS3~ | BC14 | 21 | 442512ZFHD |
| SV_RAS4~ | D18 | 12 | 316B 15 |
| SV_RAS4~ | A15 | 21 | 442512ZFHD |
| SV_SC | A16 | 14 | 316B 15 |
| SV_SC | A21 | 25 | 442512ZFHD |
| SV_SE~ | A22 | 1 | LS244 |
| SV_SE~ | H6 | 14 | PAL22V10A |
| SV_SE~ | A22 | 19 | LS244 |
| SV_SE~ | A21 | 27 | 442512ZFHD |
| SV_TRG~ | A16 | 15 | 316B 15 |

| Signal_name | Physical_location | Pin_number | Part_name |
|---|---|---|---|
| SV_TRG~ | A21 | 6 | 442512ZFHD |
| SV_WE~ | A16 | 11 | 316B 15 |
| SV_WE~ | A21 | 22 | 442512ZFHD |
| THIS_CRD1~ | H3 | 1 | LS00 |
| THIS_CRD1~ | H4 | 2 | PAL22V10A |
| THIS_CRD1~ | H7 | 23 | PAL22V10A |
| THIS_CRD2~ | H5 | 14 | PAL22V10A |
| THIS_CRD2~ | H3 | 2 | LS00 |
| THIS_CRD | H3 | 3 | LS00 |
| THIS_CRD | H2 | 9 | LS164 |
| TST_LW~ | H4 | 10 | PAL22V10A |
| TST_LW~ | H5 | 22 | PAL22V10A |
| TST_STR1~ | BC17 | 13 | EPM5192 |
| TST_STR1~ | H6 | 18 | PAL22V10A |
| TST_STR1~ | EF24 | 2 | EPM5128 |
| TST_STR1~ | H5 | 20 | PAL22V10A |
| TST_STR2~ | H5 | 19 | PAL22V10A |
| TST_STR2~ | L24 | 2 | EPM5128 |
| TST_YINC~ | BC17 | 12 | EPM5192 |
| TST_YINC~ | H4 | 21 | PAL22V10A |
| TST_YREQ | L12 | 19 | LS374 |
| TST_YREQ | BC17 | 75 | EPM5192 |
| TWELVE | F20 | 1 | LS273 |
| TWELVE | EF6 | 11 | LS240 |
| TWELVE | H9 | 9 | LS374 |
| TWELVE~ | H3 | 12 | LS00 |
| TWELVE~ | EF6 | 9 | LS240 |
| UNPACK | EF24 | 48 | EPM5128 |
| UNPACK | L24 | 51 | EPM5128 |
| UNPACK | L12 | 6 | LS374 |
| UNPACK | BC17 | 73 | EPM5192 |
| UPPER_SI | H16 | 11 | LS374 |
| UPPER_SI | L24 | 27 | EPM5128 |
| UPPER~ | F22 | 1 | LS374 |
| UPPER~ | EF24 | 19 | EPM5128 |
| UPPER~ | BC17 | 25 | EPM5192 |
| VCC | RL4 | 1 | RES |
| VCC | A25 | 108 | CBX |
| VCC | A25 | 127 | CBX |
| VCC | A25 | 14 | CBX |
| VCC | BC7 | 151 | DSP96002 |
| VCC | BC7 | 177 | DSP96002 |
| VCC | BC7 | 184 | DSP96002 |
| VCC | BC7 | 185 | DSP96002 |
| VCC | BC7 | 186 | DSP96002 |
| VCC | BC7 | 188 | DSP96002 |
| VCC | BC7 | 195 | DSP96002 |
| VCC | BC7 | 198 | DSP96002 |
| VCC | BC7 | 199 | DSP96002 |
| VCC | H2 | 2 | LS164 |
| VCC | BC7 | 206 | DSP96002 |
| VCC | BC7 | 207 | DSP96002 |
| VCC | BC7 | 208 | DSP96002 |
| VCC | BC7 | 210 | DSP96002 |
| VCC | BC7 | 217 | DSP96002 |
| VCC | BC7 | 218 | DSP96002 |
| VCC | BC7 | 220 | DSP96002 |
| VCC | BC7 | 221 | DSP96002 |
| VCC | BC17 | 24 | EPM5192 |
| VCC | A25 | 28 | CBX |
| VCC | BC17 | 3 | EPM5192 |
| VCC | A25 | 36 | CBX |
| VCC | BC17 | 45 | EPM5192 |
| VCC | A25 | 59 | CBX |
| VCC | BC17 | 66 | EPM5192 |
| VCC | A25 | 72 | CBX |

| Signal_name | Physical_location | Pin_number | Part_name |
|---|---|---|---|
| VCC | A25 | 85 | CBX |
| V_ADR0 | F26 | 1 | 316B 15 |
| V_ADR0 | L24 | 18 | EPM5128 |
| V_ADR0 | BC17 | 29 | EPM5192 |
| V_ADR0 | BC11 | 39 | EPM5128 |
| V_ADR0 | EF24 | 53 | EPM5128 |
| V_ADR1 | L24 | 19 | EPM5128 |
| V_ADR1 | F26 | 2 | 316B 15 |
| V_ADR1 | BC17 | 20 | EPM5192 |
| V_ADR1 | BC11 | 40 | EPM5128 |
| V_ADR1 | EF24 | 55 | EPM5128 |
| V_ADR2 | EF24 | 13 | EPM5128 |
| V_ADR2 | L24 | 21 | EPM5128 |
| V_ADR2 | F26 | 3 | 316B 15 |
| V_ADR2 | BC17 | 30 | EPM5192 |
| V_ADR2 | BC11 | 41 | EPM5128 |
| V_ADR3 | L24 | 12 | EPM5128 |
| V_ADR3 | EF24 | 14 | EPM5128 |
| V_ADR3 | F26 | 4 | 316B 15 |
| V_ADR3 | BC11 | 42 | EPM5128 |
| V_ADR3 | BC17 | 52 | EPM5192 |
| V_ADR4 | L24 | 13 | EPM5128 |
| V_ADR4 | EF24 | 15 | EPM5128 |
| V_ADR4 | BC11 | 43 | EPM5128 |
| V_ADR4 | F26 | 5 | 316B 15 |
| V_ADR4 | BC17 | 53 | EPM5192 |
| V_ADR5 | L24 | 14 | EPM5128 |
| V_ADR5 | BC17 | 26 | EPM5192 |
| V_ADR5 | BC11 | 44 | EPM5128 |
| V_ADR5 | EF24 | 52 | EPM5128 |
| V_ADR5 | F26 | 6 | 316B 15 |
| V_ADR6 | EF24 | 21 | EPM5128 |
| V_ADR6 | L24 | 30 | EPM5128 |
| V_ADR6 | BC11 | 45 | EPM5128 |
| V_ADR6 | F26 | 7 | 316B 15 |
| V_ADR7 | L24 | 45 | EPM5128 |
| V_ADR7 | EF24 | 56 | EPM5128 |
| V_ADR7 | F26 | 8 | 316B 15 |
| V_ADR8 | H26 | 1 | 316B 15 |
| V_ADR8 | L24 | 31 | EPM5128 |
| V_ADR8 | BC11 | 57 | EPM5128 |
| V_ADR8 | EF24 | 7 | EPM5128 |
| V_CAS~ | EF24 | 4 | EPM5128 |
| V_CAS~ | H26 | 5 | 316B 15 |
| V_CAS~ | BC11 | 58 | EPM5128 |
| V_CAS~ | H25 | 6 | 316B 15 |
| V_RAS0~ | D18 | 1 | 316B 15 |
| V_RAS0~ | BC17 | 34 | EPM5192 |
| V_RAS1~ | D18 | 2 | 316B 15 |
| V_RAS1~ | BC17 | 35 | EPM5192 |
| V_RAS2~ | D18 | 3 | 316B 15 |
| V_RAS2~ | BC17 | 36 | EPM5192 |
| V_RAS3~ | BC17 | 37 | EPM5192 |
| V_RAS3~ | D18 | 4 | 316B 15 |
| V_RAS4~ | BC17 | 38 | EPM5192 |
| V_RAS4~ | D18 | 5 | 316B 15 |
| V_RAS~ | H26 | 4 | 316B 15 |
| V_RAS~ | L24 | 5 | EPM5128 |
| V_RAS~ | EF24 | 6 | EPM5128 |
| V_RAS~ | BC11 | 62 | EPM5128 |
| V_SC | EF24 | 12 | EPM5128 |
| V_SC | BC11 | 17 | EPM5128 |
| V_SC | H26 | 3 | 316B 15 |
| V_SC | L24 | 57 | EPM5128 |
| V_SC | BC17 | 80 | EPM5192 |
| V_SE~ | H25 | 4 | 316B 15 |

| Signal_name | Physical_location | Pin_number | Part_name |
|---|---|---|---|
| V_SE~ | L24 | 53 | EPM5128 |
| V_SE~ | A10 | 7 | 316B 15 |
| V_TRG~ | EF24 | 10 | EPM5128 |
| V_TRG~ | H26 | 2 | 316B 15 |
| V_TRG~ | L24 | 6 | EPM5128 |
| V_TRG~ | BC11 | 63 | EPM5128 |
| V_TRG~ | BC17 | 76 | EPM5192 |
| V_WE~ | H26 | 6 | 316B 15 |
| V_WE~ | BC17 | 63 | EPM5192 |
| V_WE~ | BC11 | 65 | EPM5128 |
| V_WE~ | H25 | 7 | 316B 15 |
| V_WE~ | L24 | 8 | EPM5128 |
| V_WE~ | EF24 | 9 | EPM5128 |
| XACK | H1 | 6 | LS125 |
| XACK | | P1 27 | CONNECTOR |
| XINT | H6 | 19 | PAL22V10A |
| XINT | | P1 50 | CONNECTOR |
| ZERO | EF8 | 16 | PAL22V10A |
| ZERO | BC11 | 2 | EPM5128 |

APPENDIX - L

```
MODULE MULTI_BUS2 ;
Title 'MULTIBUS2'
MB2 DEVICE 'P22V10'   ;
"INPUTS:
ATE    PIN 1;
IFACK  PIN 2;
A15    PIN 3;
A16    PIN 4;
A17    PIN 5;
A18    PIN 6;
A19    PIN 7;
A20    PIN 8;
A21    PIN 9;
A22    PIN 10;
MRD    PIN 11;
MWR    PIN 13;
"OUTPUTS:
LWSI   PIN 23;
LWSTR  PIN 22;
IFSI   PIN 21;
IFSTR  PIN 20;
OFSTR  PIN 19;
OFSO   PIN 18;
LDIN1D PIN 17;
LD4D   PIN 16;
MREAD  PIN 15;
THIS2  PIN 14;
H,L,C,Z,X = 1,0,.C.,.Z.,.X.                          ;
OUTPUT = [LWSI,LWSTR,IFSI,IFSTR,OFSTR,OFSO,
LDIN1D,LD4D,MREAD,THIS2];
DUMY1   = !MRD & A22&!A21&!A20&!A19 ;"800000h => 8FFFFFh
DUMY2   = !MWR & A22&!A21&!A20&!A19 ;"800000h => 8FFFFFh
EQUATIONS
!THIS2  = DUMY1 # DUMY2 & IFSI # !IFACK & !IFSI;
!MREAD  = DUMY1;
!LD4D   = DUMY2 & !A18&!A17&!A16&!A15 ;"800000h
!LDIN1D = DUMY2 & !A18& A17& A16&!A15 ;"860000h
!IFSI   = DUMY2 & !A18& A17&!A16&!A15 ;"840000h
!IFSTR  = DUMY1 & !A18&!A17& A16&!A15 ;"820000h  - Test
```

```
!OFSTR   = DUMY2 & !A18&!A17& A16&!A15 ;"820000h  - Test
!OFSO    = DUMY1 & !A18& A17&!A16&!A15 ;"840000h
!LWSI    = DUMY2 &  A18&!A17&!A16&!A15 ;"880000h
!LWSTR   = DUMY1 &  A18&!A17&!A16&!A15 ;"880000h  - Test
ENABLE OUTPUT = !ATE;
END
```

APPENDIX - K

```
dsp.doc          Tue Dec 11 16:53:58 1990          1

; MAIN.ASM

b_size           equ      4         ; size of buffers in vram (1K)
shift            equ      2         ; 2 ^ shift = b_size      (10)
vram_size        equ      262144    ; 256K

;vram            equ      x:20000000
;out_buf         equ      y:40000000
;ct_buf          equ      y:80000000

        org      x:0
index            ds       5
s_addr           ds       5
o_l_run          ds       10
alfa             dc       0
beta             dc       0
alfa_1           dc       0         ; 1/alfa
alfa_c           dc       0
beta_c           dc       0
alfa_lc          dc       0         ; 1/alfa_ct
i_res_x          dc       0
i_res_y          dc       0
o_res_x          dc       0
o_res_y          dc       0
c_res_x          dc       0
c_res_y          dc       0
line_length      dc       0
l_leng           dc       0
lines            dc       0
lines_beta       dc       0
n_lines_c        dc       0
b_size1          dc       0         ; 1/b_size
ct_start_x       dc       0
ct_end_x         dc       0
ct_end_xc        dc       0
ct_rem_x         dc       0         ; for output
c_rem            dc       0         ; for ct
ct_start_y       dc       0
ct_end_y         dc       0
ct_end_yc        dc       0
ct_rem_y         dc       0
remx_remy        dc       0
remx_beta        dc       0
d8m              dc       0
d9h              dc       0
d8m1             dc       0
d9h1             dc       0
r7out            dc       vram_ad
n0out            dc       out_buf
r7ct             dc       vram_ad
n0ct             dc       ct_buf
l_addr           dc       vram
```

```
ef_flag         dc      $8000
count           dc      2
r               dc      0
r_ct            dc      0
frac_s          dc      0
frac_l          dc      0
n_lines         dc      0
out_inc         dc      0
ct_inc          dc      0
temp            dc      0
temp1           dc      0
temp2           dc      0
temp3           dc      0
        org     x:100
trn_tab ds      256
        org     x:1024
col_tab ds      1024
        org     x:col_tab+$4
        dc      $ff0104         ; color #1
        dc      $ff0104
        dc      $ff0104
        dc      $ff0104
        dc      $000000         ; color #2
        dc      $000000
        dc      $000000
        dc      $000000
        dc      $800000         ; color #3
        dc      $800000
        dc      $800000
        dc      $800000
        dc      $800104         ; color #4
        dc      $000104
        dc      $ff0104
        dc      $800104

        org     x:$2000         ; vram addr = $20000000
vram    dc      1,$133,0,0
        dc      1,$133,0,0
        dc      1,$133,0,0
        dc      1,$133,0,0
        dc      1,$133,0,0
        dc      1,$133,0,0
        dc      1,$133,0,0
        dc      3,$108,$220,$10b,0,0,0,0
        dc      3,$108,$221,$10a,0,0,0,0
        dc      3,$106,$224,$109,0,0,0,0
        dc      3,$106,$225,$108,0,0,0,0
        dc      3,$306,$226,$107,0,0,0,0
        dc      7,$306,$406,$207,$403,$209,$407,$30d,0,0,0,0
        dc      9,$305,$407,$206,$405,$209,$402,$203,$402,$30c,0,0
        dc      11,$305,$402,$204,$401,$205,$407,$208,$402,$204,$401,$30c,0,0,0,0
        dc      11,$304,$402,$20b,$402,$203,$402,$208,$402,$203,$402,$30c,0,0,0,0
        dc      9,$304,$402,$20b,$402,$203,$402,$208,$406,$30d,0,0
        dc      9,$304,$402,$20b,$402,$203,$402,$208,$407,$30c,0,0
        dc      9,$304,$402,$20b,$407,$208,$402,$203,$402,$30c,0,0
        dc      11,$304,$402,$20b,$402,$203,$402,$208,$402,$204,$401,$30c,0,0,0,0
        dc      11,$305,$407,$205,$402,$203,$402,$208,$402,$203,$402,$30c,0,0,0,0
        dc      9,$306,$406,$205,$402,$203,$402,$207,$407,$30d,0,0
        dc      1,$333,0,0
        dc      1,$133,0,0
        dc      1,$133,0,0
        dc      1,$133,0,0
        dc      1,$133,0,0
        dc      1,$133,0,0
        dc      1,$133,0,0
        dc      2,$123,$410,0
        dc      2,$121,$412,0
        dc      2,$120,$413,0
```

```
         dc      2,$11e,$415,0
         dc      2,$11c,$417,0
         dc      2,$11b,$418,0
         dc      2,$119,$41a,0


         org     y:0
eff_run  ds      5
d_addr   ds      5
o_l_col  ds      10
lw_line  ds      64*5
         org     y:384
vram_ad  ds      64
         org     y:2048
out_buf  ds      1000              ; addr out_buf = 40000000
ct_buf   ds      1000              ; addr ct_buf  = 80000000

         org     p:0
         jmp     main

         org     p:$100

main     movep   #$008a0000,x:$fffffffe
         movep   #$008a0000,x:$fffffffd

         debugal

         move    #out_buf,n0
         move    #col_tab,n1
         move    #o_l_run,n3
         move    #s_addr,n6
         move    #vram_ad,r7
         move    n0,x:n0out
         move    #ct_buf,x:n0ct
         move    r7,x:r7out
         move    r7,x:r7ct
         move    #vram,d1.l
         move    d1.l,x:l_addr
         move    d1.l,y:(r7)
         move    #$8000,x:ef_flag
         move    #2,x:count

         move    #63,m7                      ; for modulu 64 in vram_ad
         move    #3,m2
         move    #0,r2
         move    #3,r4
         move    #0.01,d9.l
         move    #0,d8.h

         move    #lw_line,r5
         move    #$ffffffff,d1.l
         rep     #320                        ; set lw_line buffer to -1
         move    d1.l,y:(r5)+

         move    #0,r0
         move    #4096,r1
         do      #53,copy_par
         move    x:(r1)+,d1.l
         move    d1.l,x:(r0)+
copy_par
         move    #100,r0
         do      #5,copy_trn_tab             ; copy trn_tab (256 words)
         move    x:(r1)+,d1.l
         move    d1.l,x:(r0)+
copy_trn_tab
         move    #0,r0
         do      #20,copy_y_mem
         move    x:(r1)+,d1.l
```

```
        move    d1.l,y:(r0)+
copy_y_mem

        move    #1,x:$ffffffdd             ; dma source offset
        move    #1,x:$ffffffd9             ; dma destination offset

        move    x:ct_rem_y,d0.s
        ftst    d0                         ; if (ct_rem_y == 0)
        fjeq    <no_rem                    ;     goto no_rem
        move    x:beta,d1.s
        move    d1.s,x:temp
        move    d0.s,x:beta                ; beta <- ct_rem_y
        move    x:d8ml,d8.m
        move    x:d9hl,d9.h
        move    x:remx_beta,d1.s
        move    d1.s,x:temp3
        move    x:remx_remy,d1.s
        move    d1.s,x:remx_beta
        jsr     <open_out
        move    x:temp,d0.s
        move    d0.s,x:beta                ; restore beta
        move    x:temp3,d1.s
        move    d1.s,x:remx_beta
no_rem
        move    x:d8m,d8.m
        move    x:d9h,d9.h
        move    x:ct_start_y,d1.s
        fcmp    d0,d1                      ; if (r >= ct_start_y)
        fjle    <start_ct                  ;     goto start_ct
        jsr     <open_out
        jmp     <no_rem
start_ct
        move    x:ct_end_y,d1.s
        fcmp    d0.s,d1.s                  ; if (r >= ct_end_y)
        fjle    <last_loop                 ;     goto last_loop (no ct)
        move    d0.s,x:r_ct
        move    r7,x:r7ct
        do      #5,loop
        jsr     <open_ct
        nop
loop
        move    x:ct_end_yc,d1.s
        fcmp    d0.s,d1.s                  ; if (r_ct >= ct_end_yc)
        fjle    <last_loop                 ;     goto last_loop (no ct)
o_out   jsr     <open_out
        move    x:out_inc,d1.s
        fadd.s  d3,d1                      ; out_inc += beta
        move    x:ct_inc,d3.s
        fcmp    d1,d3                      ; if (out_inc <= ct_inc)
        fjge    <o_out                     ;     goto o_out
o_ct    jsr     <open_ct
        move    x:ct_end_yc,d1.s
        fcmp    d0.s,d1.s                  ; if (r_ct >= ct_end_yc)
        fjle    <last_loop                 ;     goto last_loop (no ct)
        move    x:ct_inc,d1.s
        fadd.s  d7,d1                      ; ct_inc += beta_c
        move    x:out_inc,d7.s
        fcmp    d1,d7                      ; if (ct_inc <= out_inc)
        fjge    <o_ct                      ;     goto o_ct
        jmp     <o_out                     ; else goto o_out
last_loop
        move    x:r,d0.s
        move    x:lines_beta,d1.s
        fcmp    d1,d0                      ; if (lines <= r)
        fjgt    <end                       ;     goto end
        jsr     <open_out
        jmp     <last_loop
end
```

```
        move    x:r,d0.s
        move    x:lines,d1.s
        fsub.s  d0,d1
        move    d1.s,x:beta
        move    #0.2,d0.s
        fcmp    d0,d1
        fjsgt   <open_out

        nop
        nop
        nop
        nop
        nop

        stop

/***********************************/


; LW_OUT.ASM

get_more_items

;       Get new items from the vram to the lw_buffer in y_memory

        move    r0,r6                           ; r6 <- line_i
        move    x:count,d1.l                    ; d1 <- count (no of word to be transfere
)
        move    (r6)+n6                         ; r6 <- pointer to s_addr & d_addr
        move    x:(r6),d2.l                     ; d2 <- s_addr
_ne     jset    #31,x:<<$ffffffd8,_ne           ; dma is busy ?
        move    d1.l,x:$ffffffdc                ; dma counter
        add     d2.l,d1.l     d2.l,x:$ffffffde  ; d1 <- s_addr+count , dma s_addr
        move    d1.l,x:(r6)                     ; s_addr <- new addr
        move    y:(r6)+,d1.l                    ; d1 <- d_addr
        move    d1.l,x:$ffffffda                ; dma dest addr
        move    #$8000002a,x:$ffffffd8          ; dma enable (ext X to int Y)
        move    d1.l,x:(r0)                     ; index <- dest_addr
        rts


get_item        macro

;       o_l_run [line_i] += lw_line [line , index [line]] & 0x00ff
;       o_l_col [line_i]  = lw_line [line , index [line]] & 0xff00
;       index [line] ++

        move    y:(r5)+,d5.l                    ; d5 <- col : run
        splitb  d5.l,d1.l                       ; d1 <- col
        asl     #2,d1.l                         ; d1 <- col * 4 (for pointing to color_ta
)
        move    d1.l,y:(r3)                     ; o_l_col [line] <- col
        move    #$ff,d1.l                       ; d1 <- mask
        and     d1.l,d5.l       r5,x:(r0)       ; d5 <- run , index [line]++
        float.s d5              x:(r3),d1.s     ; d1 <- old run
        fadd.s  d1,d5           y:(r5),d1.l     ; d5 <- new run , d1.l <- next item
        tst     d1.l            d5.s,x:(r3)     ; o_l_run <- new run
;       jpl     <_nodma                         ; if next item = -1 then
        jsmi    get_more_items                  ;    get more items
_nodma
        endm

find_min        macro

;       find the minimum run_length in o_l_run

        move    n3,r3                           ; r3 <- pointer to o_l_run
        move    x:n_lines,d7.l                  ; d7 <- num of lines - 1
        move    x:(r3)+,d5.s                    ; d5 <- run of the 1'st line
```

```
        do      d7.1,_end2
        move    x:(r3)+,d7.s
        fcmp    d7,d5
        ftfr.s  d7,d5           ffgt
_end2
        endm


open_line       macro

;       open one lw line in a pixel

        ftfr.s  d2,d6           x:(r3),d5.s     ; d5 <- run [line_i] , d6 <- c
        fcmp    d5.s,d2.s       x:(r0),r5       ; run =? c , r5 <- index[line]
        fjlt    <_br
        get_item
_br
        fcmp    d5,d0                           ; run <? c + alfa
        fjle    <_le
_br1    fsub.s  d2,d5                           ; d5 <- run - cl
        fmpy    d5,d7,d1  fadd.s d5,d2  d9.1,d5.s ; d2 <- run (cl) , d5 <- 0.01
        fadd.s  d5,d1           y:(r3),r1       ; r1 <- color num (index to col_tab)
        intrz   d1              d6.s,d5.h       ; d1 <- num_pix
        tfr     d1.1,d5.1       (r1)+n1         ; r1 <- pointer to col_tab
        move    x:(r1)+,d1.1    y:(r4)+,d6.1    ; d1 <- col:cover (c) , d6 <- c
        mpyu    d1.1,d5.1,d1.1  d5.1,d8.1       ; d1 <- (col:cover)*num_pixel
        add     d1.1,d6.1       x:(r1)+,d1.1    y:(r4)-,d5.1
        mpyu    d1.1,d8.1,d1.1  x:(r0),r5
        add     d1.1,d5.1       x:(r1)+,d1.1    d6.1,y:(r4)+
        mpyu    d1.1,d8.1,d1.1
        add     d1.1,d3.1       x:(r1)+,d1.1    d5.1,y:(r4)-    ; d3 (c_m) += col (c_m)
        mpyu    d1.1,d8.1,d1.1  d5.h,d6.s
        add     d1.1,d4.1       d8.h,d9.m       ; d4 (y_k) += col (y_k)
        get_item                                ; no_ch <- 0
        fcmp    d5,d0                           ; run <? c + alfa , r4 <- line_i
        fjgt    <_br1
_le
        fsub.s  d2,d0                           ; d0 <- (c + alfa) - cl
        fmpy.s  d7,d0,d5        y:(r3),r1       ; d5 <- (num_pixl) * frac , r1 <- col nun
        fadd.s  d2,d0           d9.1,d1.s       ; d0 <- c + alfa , d1 <- 0.01
        fadd.s  d1,d5           d6.s,d2.s       ; d2 <- c
        intrz   d5              (r1)+n1         ; r1 <- pointer to col_tab
        move    x:(r1)+,d1.1    y:(r4)+,d6.1    ; d1 <- col:cover (c) , d6 <- c
        mpyu    d1.1,d5.1,d1.1  d5.1,d8.1       ; d1 <- (col:cover)*num_pixel
        add     d1.1,d6.1       x:(r1)+,d1.1    y:(r4)-,d5.1
        mpyu    d1.1,d8.1,d1.1
        add     d1.1,d5.1       x:(r1)+,d1.1    d6.1,y:(r4)+
        mpyu    d1.1,d8.1,d1.1  (r0)+
        add     d1.1,d3.1       x:(r1)+,d1.1    d5.1,y:(r4)-    ; d3 (c_m) += col (c_m)
        mpyu    d1.1,d8.1,d1.1  (r3)+
        add     d1.1,d4.1       n4,d6.1         ; d4 (y_k) += col (y_k)
        endm                                    ; d6 <- last_l

open_pixel      macro
        fcmp    d5.s,d2.s       d8.h,r0         ; r0 <- 0 , if (eff_run > c)
        fjlt    <_eff                           ;               goto eff
        move    y:(r2)+,d5.s                    ; d5 <- new eff_run
        move    d5.s,x:(r3)
        bchg    #8,x:ef_flag                    ; ct_eff <- ~ct_eff
_eff    fadd.s  d2,d0           (r3)+           ; d0 <- c+alfa
        move    x:frac_s,d7.s                   ; d7 <- frac_s
        open_line
_next_l tst     d6.1            d8.m,d7.s       ; if (last_l < start_l)
        jle     <_last_l                        ;    go to _last_l
        do      d6.1,_last_l
        open_line
_last_l move    x:frac_l,d7.s                   ; d7 <- frac_l
        ftst    d7                              ; frac_l =? 0
        fjeq    <_end_pix
        open_line
_end_pix
        endm
```

```
new_line        macro
        move    x:r,d0.s                            ; d0 <- r
        move    x:beta,d2.s     d0.s,d4.s           ; d2 <- beta , d4 <- r
        fadd.s  d2,d4           #1.0,d1.s           ; d4 <- r + beta
        fadd.s  d0,d1                               ; d1 <- r + 1
        floor   d4,d5                               ; d5 <- |r+beta| = last_l
        floor   d1,d6                               ; d6 <- |r + 1|
        int     d6              d6.s,d3.s           ; d3 <- |r + 1| = start_l

        fcmp    d5,d3           d8.m,d7.s           ; if (last_l >= start_l)
        fjle    <_fs                                ;     goto start_fraction
        fmpy.s  d2,d7,d4        d8.h,d7.s
        move    d4.s,x:frac_s                       ; frac_s <- 0
        jmp     <_fl_0

_fs
        fsub.s  d0,d3           d9.l,d0.s           ; d3 <- start_l - r
        fmpy.s  d3,d7,d7
_fs_0   move    d7.s,x:frac_s
        fsub.s  d5,d4           d9.l,d0.s           ; d4 <- r + beta - last_l
        fcmp    d0,d4           d8.m,d7.s
        fclr    d7              fflt
        fmpy.s  d4,d7,d7
_fl_0   move    d7.s,x:frac_l
        int     d5
        sub     d6.l,d5.l       d9.h,d3.h
        intrz   d2              n3,r3               ; d2 <- |beta| , r3 <- *runs
        inc     d2              d5.l,n4             ; n4 <- last_l - start_l
        inc     d2              x:(r3)+,d5.s
        rep     d2.l
        move    d8.h,x:(r3)+                        ; o_l_run [line] <- 0
        fclr    d2              n3,r3               ; d2 <- 0 (c)
        move    x:alfa,d0.s                         ; d0 <- alfa
        clr     d3.l            d0.s,d4.m
        tfr     d3.l,d4.l       d8.m,d9.m           ; no_ch <- '1'

        move    x:ct_rem_x,d1.s
        ftst    d1              d0.s,d3.m           ; d3.h <- alfa
        fjeq    <_next_pix                          ; if (ct_rem = 0) goto next_pix
        ftfr.s  d1,d0           d1.s,d3.m           ; d7.s , d3.h <- ct_rem
        move    d8.h,d9.m                           ; no_ch <- 0
        move    x:remx_beta,d3.h

_next_pix
        open_pixel
        move    #1,d7.l
        move    d9.m,d6.l                           ; d6 <- no_ch
        tst     d6.l            n0,r0               ; no_ch =? 0 , r0 <- *out_buf
        jeq     <_new_pix                           ; if eq open new pixel
        find_min
        move    x:alfa_1,d6.s                       ; d6 <- 1/alfa
        fsub.s  d2,d5                               ; d5 <- min_run - c
        fmpy.s  d5,d6,d7        d9.l,d6.s           ; d7 <- (min_run - c) / alfa
        fadd.s  d6,d7                               ; d7 <- d7 + 0.01
        intrz   d7                                  ; d7 <- length (num of out pixl)
_new_pix
        move    x:ef_flag,d5.l
        or      d7.l,d5.l       d3.m,d1.s           ; d1 <- alfa
        float.s d7              d5.l,y:(r0)+
        fmpy.s  d1,d7,d7        y:(r4),d5.l         ; d7 <- length*alfa , d5 <- c
        split   d5.l,d1.l       d3.h,d6.s           ; d1 <- color
        float.s d1              d8.h,y:(r4)+        ; y:(r4) <- 0
        fmpy.s  d1,d6,d1                            ; d1 <- color * 1/s
        intrz   d1              d9.h,d3.h
        join    d5.l,d1.l       y:(r4),d5.l         ; d1 <- cover : color , d5 <- m
        split   d5.l,d1.l       d1.l,y:(r0)+
        float.s d1              d8.h,y:(r4)-
        fmpy.s  d1,d6,d1        n3,r3               ; r3 <- 0
        intrz   d1
        join    d5.l,d1.l       d8.m,d9.m           ; no_ch <- '1'
        split   d3.l,d1.l       d1.l,y:(r0)+
        float.s d1              x:(r3),d5.s
```

```
        fmpy.s  d1,d6,d1
        intrz   d1
        join    d3.l,d1.l     d8.h,d3.l        ; d3 <- 0
        split   d4.l,d1.l     d1.l,y:(r0)+
        float.s d1            d4.m,d3.m
        fmpy.s  d1,d6,d1      d4.m,d0.s        ; d0 <- alfa
        intrz   d1            n7,d6.s          ; d6 <- line length
        join    d4.l,d1.l     d8.h,d4.l        ; d4 <- 0
        fadd.s  d7,d2         d1.l,y:(r0)+     ; d2 <- new c
        fcmp    d2,d6         r0,n0            ; n0 <- new location in out_buf
                                               ; c =? line length
        fjgt    <_next_pix

        endm

open_out
        move    #col_tab,n1
        move    x:n0out,n0
        move    x:r7out,r7
        move    x:l_leng,n7
        move    x:r,d0.s
        move    x:beta,d3.s                    ; d3 <- beta
        move    #0.99,d2.s                     ; d2 <- 0.99
        move    x:ct_end_x,d1.s
        move    d1.s,y:1

        fadd.s  d0,d3                          ; d3 <- r + beta
        fadd.s  d2.s,d3.s                      ; d3 <- r + beta + 0.99
        floor   d3,d7         n3,r3            ; d7 <- | r+beta |
        floor   d0,d5         n6,r6            ; d5 <- |_ r _| , r6 <- s_addr
        fsub.s  d5,d7         d8.h,r2          ; d7 <- | r+beta | - |_r_|
        int     d7            d8.h,r0
        move    d7.l,x:n_lines

        move    #500000.0,d3.s
        move    #$8000,x:ef_flag
        move    x:ct_start_y,d1.s
        fcmp    d1,d0         x:ct_end_y,d1.s ; if (ct_start > r)
        fjlt    <_no_ct                        ;     goto no_ct
        fcmp    d0,d1                          ; if (r >= ct_end)
        fjle    <_no_ct                        ;     go to no_ct
        move    y:(r2)+,d3.s                   ; if (ct_start <= r < ct_end)
_no_ct
        move    d3.s,x:(r3)

        move    #0.9991,d4.s                   ; d4 <- 0.9991
        move    #b_size,d5.l                   ; d5 <- b_size
        move    x:b_size1,d0.s                 ; d0 <- 1/b_size
        do      d7.l,_loo
        move    y:(r7)+,r5                     ; r5 <- addr of line in vram
        move    r5,d2.l
        move    x:(r5)+,d1.l                   ; d1 <- num of lw words in line
        inc     d1.l          n5,r3            ; the total length is the number
        inc     d1.l                           ; of lw words + length word +
        float.s d1            (r3)+            ; zero word in the end
        fmpy.s  d0,d1,d1      r3,n5            ; d1 <- length * 1/b_size
        fadd.s  d4,d1                          ; d1 <- d1 + 0.99
        intrz   d1
        mpys    d5.l,d1.l,d1.l                 ; d1 <- d1 * b_size
        add     d2.l,d1.l                      ; d1 <- last addr + d1
        move    d1.l,y:(r7)                    ; vram_add <- addr of next line
        move    r5,x:(r6)                      ; s_addr <- start of curent line
        jsr     get_more_items                 ; initialize the lw_line buffer
        move    (r0)+
_loo
        new_line
        move    x:beta,d3.s
        move    x:r,d4.s
        fadd.s  d3,d4         n5,r3            ; r <- r + beta
        floor   d4,d5         d9.l,d1.s        ; d5 <- |_r_|
        fsub.s  d5,d4         d4.s,d0.s        ; d4 <- fractin (r)
        fcmp    d1,d4         #0.99,d2.s       ; 0.01 >? fracion (r)
```

```
        fcmp    d4,d2           ffgt.u          ; fraction (r) >? 0.99
        fint    d0,d0           ffle
        fjle    <_no_dec
        move    (r7)-
        move    (r3)-
_no_dec move    d0.s,x:r                        ; r <- d0

        move    y:(r7),d5.l                     ; d5 <- addr of last line
        move    x:l_addr,d1.l
        move    d5.l,x:l_addr
        sub     d1.l,d5.l       r3,n5
        move    #vram_size,d1.l
        tst     d5.l            n3,r3
        add     d1.l,d5.l       iflt
        asr     #shift,d5.l                     ; d5 <- num of blocks to be free

        move    r7,x:r7out
        move    n0,x:n0out
        rts


/***********************************/


; LW_CT.ASM


get_item_c      macro

;       o_l_run [line_i] += lw_line [line , index [line]] & 0x00ff
;       o_l_col [line_i]  = lw_line [line , index [line]] & 0xff00
;       index [line] ++

        move    y:(r5)+,d5.l                    ; d5 <- col : run
        splitb  d5.l,d1.l                       ; d1 <- col , r3 <- pointer to o_l_run [l
ne]
        move    d1.l,y:(r3)                     ; o_l_col [line] <- col
        move    #$ff,d1.l                       ; d1 <- mask
        and     d1.l,d5.l       r5,x:(r0)       ; d5 <- run , index [line]++
        float.s d5              x:(r3),d1.s     ; d1 <- old run
        fadd.s  d1,d5           y:(r5),d1.l     ; d5 <- new run , d1.l <- next item
        tst     d1.l            d5.s,x:(r3)     ; o_l_run <- new run
;       jpl     <_nodma                         ; if next item = -1 then
        jsmi    get_more_items                  ;    get more items
_nodma
        endm

find_min_c      macro

;       find the minimum run_length in o_l_run

        move    n3,r3                           ; r3 <- pointer to o_l_run
        move    x:n_lines_c,d7.l                ; d7 <- num of lines - 1
        move    x:(r3)+,d5.s                    ; d5 <- run of the 1'st line
        do      d7.l,_end2
        move    x:(r3)+,d7.s
        fcmp    d7,d5
        ftfr.s  d7,d5           ffgt
_end2
        endm

open_line_c     macro

;       open one lw line in a pixel

        ftfr.s  d2,d6           x:(r3),d5.s     ; d5 <- run [line_i] , d6 <- c
        fcmp    d5.s,d2.s       x:(r0),r5       ; run =? c , r5 <- index[line]
        fjlt    <_br
        get_item_c
_br
        fcmp    d5,d0                           ; run <? c + alfa , r3 <- line_i
        fjle    <_le
```

```
_brl    ftfr.s  d5,d2          x:(r0),r5      ; d2 <- run (cl) , r3 <- pointer to o_l_c
l
        move    y:(r3),r1                     ; r1 <- col [line]
        move    d8.h,d9.m                     ; no_ch <- 0
        move    (r1)+n1                       ; r1 <- pointer to col_tab
        move    x:(r1)+,d1.l                  ; d1 <- col (c_m_y_k)
        and     d1.l,d3.l
        get_item_c
        fcmp    d5,d0                         ; run <? c + alfa , r3 <- line_i
        fjgt    <_brl
_le
        move    y:(r3),r1                     ; r1 <- col [line]
        ftfr.s  d6,d2          (r0)+          ; d2 <- c
        move    (r1)+n1                       ; r1 <- pointer to col_tab
        move    x:(r1)+,d1.l                  ; d1 <- col (c_m_y_k)
        and     d1.l,d3.l      (r3)+
        endm

open_pixel_c    macro
        fcmp    d5.s,d2.s      d8.h,r0        ; r0 <- 0 , if (eff_run > c)
        fjlt    <_eff                         ;                goto eff
        move    y:(r2)+,d5.s                  ; d5 <- new eff_run
        move    d5.s,x:(r3)
_eff    fadd.s  d2,d0          (r3)+          ; d0 <- c+alfa
        do      n4,_last_l
        open_line_c
_last_l
        endm

new_line_c      macro
        fclr    d2             n3,r3          ; d2 <- 0 (c)
        move    y:(r2)+,d5.s
        move    d5.s,x:(r3)+
        rep     n4
        move    d8.h,x:(r3)+                  ; o_l_run [line] <- 0
        move    #$01111,d3.l
        tfr     d3.l,d4.l      d3.l,d9.m      ; no_ch <- '1'
        move    n3,r3

        move    x:alfa_c,d0.s                 ; d0 <- alfa
        move    x:c_rem,d1.s
        move    d0.s,d4.m
        ftst    d1             d0.s,d3.m
        fjeq    <_next_pix
        ftfr.s  d1,d0          d1.s,d3.m
        clr     d4.l           d8.h,d9.m
_next_pix
        open_pixel_c
        move    #1,d7.l
        cmp     d4.l,d3.l      d9.m,d6.l      ; d6 <- no_ch
        clr     d4.l           ifne
        or      d4.l,d6.l      n0,r0          ; no_ch =? 0  , r0 <- *ct_buf
        jeq     <_new_pix                     ; if eq open new pixel
        find_min_c
        move    x:alfa_lc,d6.s                ; d6 <- 1/alfa
        fsub.s  d2,d5                         ; d5 <- min_run - c
        fmpy.s  d5,d6,d7       d9.l,d6.s      ; d7 <- (min_run - c) / alfa
        fadd.s  d6,d7                         ; d7 <- d7 + 0.01
        tst     d4.l           #0.98,d6.s     ; if transparent (d4 = 0) then
        fadd.s  d6,d7          ifeq           ;    d7 <- d7 + 0.98
        intrz   d7                            ; d7 <- length (num of out pixl)
_new_pix
        float.s d7             d7.l,y:(r0)
        move    x:ct_start_x,d1.s
        fcmp    d2,d1          d3.m,d1.s      ; if (c < ct_start)
        fjgt    <_no_write                    ;     dont_write !
        bset    #15,y:(r0)+                   ; this word is header
        move    d3.l,y:(r0)+
_no_write
        fmpy.s  d1,d7,d7       r0,n0          ; d7 <- length*alfa
        fadd.s  d7,d2          d4.m,d3.m      ; d2 <- new c , d4 <- 0.01
        move    n7,d6.s                       ; d6 <- line length
```

```
        move    d4.m,d0.s
        move    n3,r3
        move    #$01111,d3.1
        tfr     d3.1,d4.1       d3.1,d9.m       ; no_ch <- '1'
        fcmp    d2,d6           x:(r3),d5.s     ; n0 <- new location in ct_buf
                                                ; c =? line length

        fjgt    <_next_pix

        endm


open_ct
        move    #trn_tab,n1
        move    x:n_lines_c,n4
        move    x:n0ct,n0
        move    x:r7ct,r7
        move    x:ct_end_xc,n7
        move    n7,y:1

        move    #0,r0
        move    #0.9991,d4.s                    ; d4 <- 0.99
        move    n6,r6                           ; r6 <- s_addr
        move    #b_size,d5.1                    ; d5 <- b_size
        move    x:b_size1,d0.s                  ; d0 <- 1/b_size
        do      n4,_loo
        move    y:(r7)+,r5                      ; r5 <- addr of line in vram
        move    r5,d2.1
        move    x:(r5)+,d1.1                    ; d1 <- num of lw words in line
        inc     d1.1            n5,r3           ; the total length is the number
        inc     d1.1                            ; of lw words + length word +
        float.s d1              (r3)+           ; zero word in the end
        fmpy.s  d0,d1,d1        r3,n5           ; d1 <- length * 1/b_size
        fadd.s  d4,d1                           ; d1 <- d1 + 0.99
        intrz   d1              d8.h,r2
        mpys    d5.1,d1.1,d1.1                  ; d1 <- d1 * b_size
        add     d2.1,d1.1                       ; d1 <- last addr + d1
        move    d1.1,y:(r7)                     ; vram_add <- addr of next line
        move    r5,x:(r6)                       ; s_addr <- start of curent line
        jsr     get_more_items                  ; initialize the lw_line buffer
        move    (r0)+
_loo
        new_line_c
        move    x:beta_c,d3.s
        move    x:r_ct,d4.s
        fadd.s  d3,d4           n5,r3           ; r <- r + beta
        floor   d4,d5           d9.1,d1.s       ; d5 <- |_r_|
        fsub.s  d5,d4           d4.s,d0.s       ; d4 <- fractin (r)
        fcmp    d1,d4           #0.99,d2.s      ; 0.01 >? fracion (r)
        fcmp    d4,d2           ffgt.u          ; fraction (r) >? 0.99
        fint    d0,d0           ffle
        fjle    <_no_dec
        move    (r7)-
        move    (r3)-
_no_dec move    d0.s,x:r_ct                     ; r <- d0

        fadd.s  d0,d3           r3,n5           ; d3 <- r + beta
        fadd.s  d2.s,d3.s       n3,r3           ; d3 <- r + beta + 0.99
        floor   d3,d3                           ; d3 <- | r+beta |
        floor   d0,d5                           ; d5 <- |_ r _|
        fsub.s  d5,d3                           ; d3 <- | r+beta | - |_r_|
        int     d3
        move    d3.1,x:n_lines_c

        move    r7,x:r7ct
        move    n0,x:n0ct
        rts


/*************************************/
```

```
/*  LOAD_PAR.C    */

/*  calculate and load parameters to dsp  */


#include        stdlib
#include        <stdio>

#define B_SIZE          4
#define SHIFT           2
#define VRAM_SIZE       262144

double  alfa, beta, alfa_1,alfa_c, beta_c, alfa_1c,
        l_leng, lines_beta, n_lines_c, b_size1,
        ct_end_x, ct_rem_x, c_rem, ct_end_y, ct_rem_y,
        remx_remy, remx_beta, d8m, d9h, d8ml, d9hl;

FILE    *fpd, *fpf;

typedef union
{
 float fl;
 long   l;
 struct
 {
  unsigned short int1;
  unsigned short int2;
 } in;
} flt_int;

flt_int flt2int;
short   i , j;
char    line [40];

print_flot (flt)
float   flt;
{

 flt2int.fl = flt;
 if (flt != 0)
     flt2int.l -= 0x100;

 fprintf (fpf,"%04X%04X ",flt2int.in.int1,flt2int.in.int2);
}



calc_par (i_res_x, i_res_y,
          o_res_x, o_res_y,
          c_res_x, c_res_y,
          line_length, num_of_lines,
          ct_start_x, ct_end_xc,
          ct_start_y, ct_end_yc)

short   i_res_x, i_res_y, o_res_x, o_res_y, c_res_x, c_res_y,
        line_length, num_of_lines;
double  ct_start_x, ct_end_xc,
        ct_start_y, ct_end_yc;

{
 short  s_128;
 double s, t, n;

b_size1 = 1.0 / B_SIZE;
alfa_1 = (double) o_res_x / i_res_x;
alfa = (double) i_res_x / o_res_x;
beta = (double) i_res_y / o_res_y;

s = alfa * beta;
s_128 = (short) (128.0 / s);
```

```
 d8m = (double) s_128;
 d9h = 1 / d8m / s;

 ct_rem_x = ct_start_x - ((short) (ct_start_x / alfa) * alfa);
 ct_rem_y = ct_start_y - ((short) (ct_start_y / beta) * beta);

 if (ct_rem_x != 0)
    {
     s = ct_rem_x * beta;
     remx_beta = 1 / d8m / s;
    }
 if (ct_rem_y != 0)
    {
     s = alfa * ct_rem_y;
     s_128 = (short) (128.0 / s);
     d8m1 = (double) s_128;
     d9h1 = 1 / d8m1 / s;
     if (ct_rem_x != 0)
        {
         s = ct_rem_x * ct_rem_y;
         remx_remy = 1 / d8m1 / s;
        }
    }

 alfa_ic = (double) c_res_x / i_res_x;
 alfa_c = (double) i_res_x / c_res_x;
 beta_c = (double) i_res_y / c_res_y;

 c_rem = ct_start_x - ((short) (ct_start_x / alfa_c) * alfa_c);
 n_lines_c = 1.0 + (short) (beta_c - 0.01);
 l_leng = line_length - alfa;
 lines_beta = num_of_lines - beta;

 t = (double) c_res_x / o_res_x;
 printf ("t = %f\n",t);
 n = (ct_end_xc - ct_start_x) / alfa_c;
 printf ("n = %f\n",n);
 ct_end_x = ((short) ((n - 1) / t) + 1) * alfa + ct_start_x;

 t = (double) c_res_y / o_res_y;
 n = (ct_end_yc - ct_start_y) / beta_c;
 ct_end_y = ((short) ((n - 1) / t) + 1) * beta + ct_start_y;

}

main ()
{
double  i_res_x = 15.0, i_res_y = 15.0,
        o_res_x = 3.0, o_res_y = 3.0,
        c_res_x = 5.0, c_res_y = 5.0,
        line_length = 51.0, num_of_lines = 36.0;
double  ct_start_x = 3.0, ct_end_xc = 45.0,
        ct_start_y = 11.0, ct_end_yc = 29.0;

calc_par (15,15,3,3,5,5,51,36,3.0,45.0,11.0,29.0);

if ((fpf = fopen ("x1.lod","w")) == NULL)
   {
     printf (" ERROR OPENNING x1.lod \n");
     exit (1);
   }

fprintf (fpf,"_START X 0000 0000 0000 DSP96000 1.0\n\n");
fprintf (fpf,"_DATA X   00001000\n");
fprintf (fpf,"00000000 00000000 00000000 00000000 ");
fprintf (fpf,"00000000 00000000 00000000 00000000\n");
fprintf (fpf,"00000000 00000000 48F42400 00000000 ");
fprintf (fpf,"00000000 00000000 00000000 00000000\n");
fprintf (fpf,"00000000 00000000 00000000 00000000 ");
```

```
print_flot ((float) alfa);
print_flot ((float) beta);
print_flot ((float) alfa_1);
print_flot ((float) alfa_c);
fprintf (fpf,"\n");
print_flot ((float) beta_c);
print_flot ((float) alfa_1c);
print_flot ((float) i_res_x);
print_flot ((float) i_res_y);
print_flot ((float) o_res_x);
print_flot ((float) o_res_y);
print_flot ((float) c_res_x);
print_flot ((float) c_res_y);
fprintf (fpf,"\n");
print_flot ((float) line_length);
print_flot ((float) l_leng);
print_flot ((float) num_of_lines);
print_flot ((float) lines_beta);
fprintf (fpf,"%08X ",(short) n_lines_c);
print_flot ((float) b_size1);
print_flot ((float) ct_start_x);
print_flot ((float) ct_end_x);
fprintf (fpf,"\n");
print_flot ((float) ct_end_xc);
print_flot ((float) ct_rem_x);
print_flot ((float) c_rem);
print_flot ((float) ct_start_y);
print_flot ((float) ct_end_y);
print_flot ((float) ct_end_yc);
print_flot ((float) ct_rem_y);
print_flot ((float) remx_remy);
fprintf (fpf,"\n");
print_flot ((float) remx_beta);
print_flot ((float) d8m);
print_flot ((float) d9h);
print_flot ((float) d8m1);
print_flot ((float) d9h1);
fprintf (fpf,"00000000 ");
fprintf (fpf,"00001111 ");
fprintf (fpf,"00000000 ");
fprintf (fpf,"\n");
fprintf (fpf,"00001010 ");
fprintf (fpf,"00001111 ");
print_flot ((float) ct_start_x);
fprintf (fpf,"00000000 ");
print_flot ((float) line_length);
fprintf (fpf,"00000000 ");
fprintf (fpf,"00000000 ");
fprintf (fpf,"00000014 ");
fprintf (fpf,"\n");
fprintf (fpf,"00000054 ");
fprintf (fpf,"00000094 ");
fprintf (fpf,"000000D4 ");
fprintf (fpf,"00000114 ");


fprintf (fpf,"\n");
fprintf (fpf,"_END\n");
}
```

APPENDIX - M

```
MODULE MULTI_BUS1 ;
Title 'MULTIBUS1'
MB1 DEVICE 'P22V10'  ;
"INPUTS:
ATE     PIN 1;
A4      PIN 2;
A5      PIN 3;
```

```
A6      PIN 4;
A7      PIN 5;
A8      PIN 6;
A9      PIN 7;
A10     PIN 8;
A11     PIN 9;
A12     PIN 10;
A13     PIN 11;
A14     PIN 13;
IOWR    PIN 14;
IORD    PIN 15;
MREAD   PIN 16;


"OUTPUTS:
THIS1     PIN 23;
SPXPROG   PIN 22;
SPXTEST   PIN 21;
CBXPROG   PIN 20;
CBXTEST   PIN 19;
MBREAD    PIN 18;
RDSTTS    PIN 17;

H,L,C,Z,X = 1,0,.C.,.Z.,.X.                           ;

OUTPUT = [THIS1, SPXPROG, SPXTEST, CBXPROG, CBXPROG
          , MBREAD, RDSTTS];

DUMY1 = !IOWR & !A14&!A13&!A12&!A11&!A10& A9&!A8& A7;
                "5xxH , write
DUMY2 = !IORD & !A14&!A13&!A12&!A11&!A10& A9&!A8& A7;
                "5xxH , read

EQUATIONS

!THIS1   = DUMY1 # DUMY2;
!MBREAD  = DUMY2 # !MREAD;
!RDSTTS  = DUMY2 & !A6&!A5&!A4;          "50x - 51x
!CBXPROG = DUMY1 & !A6& A5&!A4;          "54x - 55x
!CBXTEST = DUMY2 & !A6& A5&!A4;          "54x - 55x
!SPXPROG = DUMY1 & !A6& A5& A4;          "56x - 57x
!SPXTEST = DUMY2 & !A6& A5& A4;          "56x - 57x

ENABLE OUTPUT = !ATE;

END
```

APPENDIX - N

```
MODULE MULTI_BUS3 ;
Title 'MULTIBUS3'

MB3 DEVICE 'P22V10'  ;
"INPUTS:
CLK      PIN 1;
THIS1    PIN 2;
A0       PIN 3;
A1       PIN 4;
A2       PIN 5;
A3       PIN 6;
A4       PIN 7;
A5       PIN 8;
A6       PIN 9;
TST_LW   PIN 10;
BINIT    PIN 11;
ATE      PIN 13;
```

```
"OUTPUTS:
LD_MACRO2  PIN 23;
LD_MACRO1  PIN 22;
TST_YINC   PIN 21;
INIT       PIN 20;
LD_NOP2    PIN 19;
LD_NOP11   PIN 18;
LD_NOP10   PIN 17;
LW_STR     PIN 16;
H,L,C,Z,X = 1,0,.C.,.Z.,.X.                        ;
OUTPUT = [LD_MACRO2,LD_MACRO1,TST_YINC,INIT,
LD_NOP2,LD_NOP11,LD_NOP10,LW_STR];
EQUATIONS
!LD_MACRO1 = !THIS1 & !A6&!A5&!A4&!A3&!A2&!A1&!A0;" 500H
!LD_MACRO2 = !THIS1 & !A6&!A5&!A4& A3&!A2&!A1&!A0;"510H
!LD_NOP10  = !THIS1 & !A6&!A5&!A4&!A3&!A2&!A1& A0;"502H
!LD_NOP11  = !THIS1 & !A6&!A5&!A4&!A3&!A2& A1&!A0;"504H
!LD_NOP2   = !THIS1 & !A6&!A5&!A4&!A3&!A2& A1& A0;"506H
!LW_STR    = !THIS1 & !A6&!A5&!A4&!A3& A2&!A1&!A0 "508H
           # !TST_LW;
!TST_YINC  = !THIS1 & !A6&!A5& A4&!A3&!A2&!A1&!A0;"520H
!INIT     := !THIS1 & !A6&!A5& A4& A3&!A2&!A1&!A0"530H
                    # !BINIT;
ENABLE OUTPUT = !ATE;
END
```

APPENDIX - O - I

```
MODULE MULTI_BUS4 ;
Title 'MULTIBUS4'
MB4 DEVICE 'P22V10'  ;
"INPUTS:
I1         PIN 1;
I2         PIN 2;
I3         PIN 3;
I4         PIN 4;
DMEM_TEST  PIN 6;
MEM_TEST   PIN 7;
LOAD       PIN 8;
MRD        PIN 9;
ATE        PIN 13;
"OUTPUTS:
RDBK0      PIN 23;
LUTCS1     PIN 22;
LUTCS2     PIN 21;
LUTCS3     PIN 20;
RDBK       PIN 19;
RDBK1      PIN 18;
RDBK2      PIN 17;
RDBK3      PIN 16;
LUTADR16   PIN 15;
LUTADR17   PIN 14;
H,L,C,Z,X = 1,0,.C.,.Z.,.X.                        ;
LUT_ADR = [LUTADR16,LUTADR17];
OUTPUT=[RDBK0,LUTCS1,LUTCS2,LUTCS3,RDBK,RDBK1,RDBK2,RDBK3];
LUT0  = !I4&!I3&!I2&!I1 ;
LUT1  = !I4&!I3&!I2& I1 ;
LUT2  = !I4&!I3& I2&!I1 ;
LUT3  = !I4&!I3& I2& I1 ;
LUT4  = !I4& I3&!I2&!I1 ;
LUT5  = !I4& I3&!I2& I1 ;
LUT6  = !I4& I3& I2&!I1 ;
LUT7  = !I4& I3& I2& I1 ;
LUT8  =  I4&!I3&!I2&!I1 ;
LUT9  =  I4&!I3&!I2& I1 ;
LUT10 =  I4&!I3& I2&!I1 ;
LUT11 =  I4&!I3& I2& I1 ;
LUT12 =  I4& I3&!I2&!I1 ;
```

APPENDIX - O - 2

```
EQUATIONS

!RDBK    = LOAD # MEM_TEST # DMEM_TEST;

LUTCS1 = !(LUT0 # LUT3 # LUT6 # LUT9 ) & LOAD;
LUTCS2 = !(LUT1 # LUT4 # LUT7 # LUT10) & LOAD;
LUTCS3 = !(LUT2 # LUT5 # LUT8 # LUT11) & LOAD;

!RDBK1  = (LUT0 # LUT3 # LUT6 # LUT9 ) & !MRD & MEM_TEST;
!RDBK2  = (LUT1 # LUT4 # LUT7 # LUT10) & !MRD & MEM_TEST;
!RDBK3  = (LUT2 # LUT5 # LUT8 # LUT11) & !MRD & MEM_TEST;

!RDBK0  = LUT12 & !MRD & MEM_TEST;

LUTADR16 = LUT3 # LUT4 # LUT5 # LUT9 # LUT10 # LUT11;
LUTADR17 = LUT6 # LUT7 # LUT8 # LUT9 # LUT10 # LUT11;

ENABLE LUT_ADR = !ATE & !RDBK;
ENABLE OUTPUT  = !ATE;

END
```

APPENDIX - P

```
MODULE MULTI_BUS5 ;
Title 'MULTIBUS5'
MB5 DEVICE 'P22V10'  ;
"INPUTS:
ATE            PIN 1;
THIS2          PIN 2;
A15            PIN 3;
A16            PIN 4;
A17            PIN 5;
A18            PIN 6;
INT_MASK0      PIN 7;
INT_MASK1      PIN 8;
CT_HFULL       PIN 9;
LW_HFULL       PIN 10;
MREAD          PIN 20;
RDBK           PIN 11;      " TEMPORARY
SP_SEL         PIN 13;
TST_STR        PIN 18;
"OUTPUTS:
DSP_MEM_WE     PIN 23;
DSP_FIFO_SI    PIN 22;
DSP_FIFO_SO    PIN 21;
XINT           PIN 19;
IF_OE          PIN 17;      " TEMPORARY
SF_OE          PIN 16;
IV_SE          PIN 15;
SV_SE          PIN 14;
H,L,C,Z,X = 1,0,.C.,.Z.,.X.                    ;
OUTPUT = [DSP_MEM_WE, DSP_FIFO_SI, DSP_FIFO_SO, XINT];
EQUATIONS
!DSP_MEM_WE  = !THIS2 &  MREAD & !A18&!A17&!A16& A15 ;
"810000h
!DSP_FIFO_SI = !THIS2 &  MREAD & !A18&!A17& A16& A15 ;
"830000h
!DSP_FIFO_SO = !THIS2 & !MREAD & !A18&!A17& A16& A15 ;
"830000h
```

```
!XINT  = !INT_MASK0 & !CT_HFULL # !INT_MASK1 & !LW_HFULL;
!IF_OE = !SP_SEL & !TST_STR; "ct_buf1 testing => 244 oe
!SF_OE =  SP_SEL & !TST_STR; "sp_buf1 testing => mux oe
!IV_SE = !SP_SEL & !RDBK; "ct_buf1 working => serial oe
!SV_SE =  SP_SEL & !RDBK; "sp_buf1 working => serial oe
ENABLE OUTPUT = !ATE;
END
```

APPENDIX - Q - 1

```
MODULE DSP1A ;
"FLAG '-R3'
Title 'DSP'

DSP1  DEVICE 'P22V10'  ;

"INPUTS:

CLK          PIN 1 ;
TST_FIFO_SI  PIN 2;
MEM_TEST     PIN 3;
BANK_SEL     PIN 4;
LOAD         PIN 5;
ARW          PIN 6;
AS0          PIN 7;
AS1          PIN 8;
LW_IR        PIN 9;
MRG_IR       PIN 10;
ATS          PIN 11;
ATE          PIN 13;
AA31         PIN 14;
AA30         PIN 15;
MRD          PIN 16;


"OUTPUTS:

SBANK_CS1    PIN 23;
SBANK_CS2    PIN 22;
LW_SI        PIN 21;
MRG_SI       PIN 20;
ATA          PIN 19;
RDBK4        PIN 18;
RDBK5        PIN 17;


H,L,Z,X = 1,0,.Z.,.X.                              ;

C = .C.;
```

APPENDIX - Q - 2

```
OUTPUTS = [ SBANK_CS1,SBANK_CS2,LW_SI,MRG_SI,ATA,RDBK4
           ,RDBK5];

EQUATIONS

ENABLE OUTPUTS = !ATE;
```

```
"    Bank selected on write attempt because
" common write enable
"   on both banks. On run mode selected by S0 and S1

SBANK_CS1 = (LOAD # MEM_TEST) & !BANK_SEL #
             AS1 & !AS0 # !AS1 & AS0;
SBANK_CS2 = (LOAD # MEM_TEST) &  BANK_SEL #
             AS1 & !AS0 # !AS1 & AS0;

"    Fifo shift in selected on fifo test attempt
" by bank select
"    On run mode selected by S0 and S1

!LW_SI = (MEM_TEST & !BANK_SEL & !TST_FIFO_SI #
         !MEM_TEST & !ARW & AS0 & AS1 & AA31 &
         !AA30 & !ATS) & LW_IR ;

!MRG_SI = (MEM_TEST & BANK_SEL & !TST_FIFO_SI #
        !MEM_TEST & !ARW & AS0 & AS1 & !AA31 &
        AA30 & !ATS) & MRG_IR ;

" DSP H.S by aTA on each dsp write attempt to fifo

!ATA := !MEM_TEST & (LW_SI # MRG_SI);

" A state in which both LOAD and MEM_TEST is used
" for fifo test
" LOAD is used load memory (TEST_MEM not true!!)
" TEST_MEM tests memory on LOAD not true.

!RDBK4 = MEM_TEST & !LOAD & !BANK_SEL & !MRD;

!RDBK5 = MEM_TEST & !LOAD &  BANK_SEL & !MRD;

END
```

APPENDIX - R

```
MODULE DSP2A ;
"FLAG '-R3'
Title 'DSPb'

DSP2 DEVICE 'P22V10';
"INPUTS:

CLK            PIN 1;
TST_FIFO_SO    PIN 2;
MEM_TEST       PIN 3;
BANK_SEL       PIN 4;
LW_STR         PIN 7;  "SP BUF  DATA STROBE
MRG_STR        PIN 8;  "SPATIAL DATA STROBE
ATE            PIN 13;

"OUTPUTS:

LW_RDBK        PIN 23;
MRG_RDBK       PIN 22;
LW_SO          PIN 21;
MRG_SO         PIN 20;
MRG_ACK        PIN 19;

H,L,Z,X = 1,0,.Z.,.X.                    ;
C = .C.;
OUTPUTS = [ LW_RDBK,MRG_RDBK,LW_SO,MRG_SO,MRG_ACK ];
```

```
EQUATIONS

ENABLE OUTPUTS = !ATE;
!LW_RDBK  = !TST_FIFO_SO & !BANK_SEL;
!MRG_RDBK = !TST_FIFO_SO &  BANK_SEL;
!LW_SO    = !TST_FIFO_SO & !BANK_SEL & MEM_TEST #
            !LW_STR & !MEM_TEST;
!MRG_SO   = !TST_FIFO_SO &  BANK_SEL & MEM_TEST #
            !MRG_STR & !MEM_TEST;
!MRG_ACK := !MRG_STR;
 END
```

APPENDIX - S

```
MODULE ZERO_DET ;
Title 'ZERO_DETECT'
ZERO DEVICE 'P22V10'  ;
"INPUTS:
ATE     PIN 1;
D1      PIN 2;
D2      PIN 3;
D3      PIN 4;
D4      PIN 5;
D5      PIN 6;
D6      PIN 7;
D7      PIN 8;
D8      PIN 9;
D9      PIN 10;
D10     PIN 11;
D11     PIN 13;
D12     PIN 23;
D13     PIN 22;
D14     PIN 21;
D15     PIN 20;
D16     PIN 19;
"OUTPUTS:
ZERO1  PIN 16;
H,L,C,Z,X = 1,0,.C.,.Z.,.X.                        ;
OUTPUT = [ZERO1];

EQUATIONS
ZERO1 = !D1 & !D2 & !D3 & !D4 & !D5 & !D6 & !D7 & !D8 &
  !D9 & !D10 & !D11 & !D12 & !D13 & !D14 & !D15 & !D16 ;

ENABLE OUTPUT = !ATE;

END
```

APPENDIX T

CHAPTER 3

IMAGE TRANSFORMS

And be not conformed to this world:
but be ye transformed by the renewing
of your mind . . .
*Romans 12:2*

The material in this chapter deals primarily with the development of two-dimensional transforms and their properties. Transform theory has played a key role in image processing for a number of years, and it continues to be a topic of interest in theoretical as well as applied work in this field. Two-dimensional transforms are used in the following chapters for image enhancement, restoration, encoding, and description.

Although other transforms are discussed in some detail in this chapter, emphasis is placed on the Fourier transform because of its wide range of applications in image processing problems. The Fourier transform of one and two continuous variables is introduced in Section 3.1. These concepts are then expressed in discrete form in Section 3.2. Several important properties of the two-dimensional Fourier transform are developed and illustrated in Section 3.3. This section is followed by the development of a fast Fourier transform algorithm which can be used to reduce the number of calculations to a fraction of that required to implement the discrete Fourier transform by direct methods. Section 3.5 deals with the development of the Walsh, Hadamard, and Discrete Cosine transforms, and Section 3.6 introduces the Hotelling transform. Finally, Section 3.7 deals with the development of the Hough transform and some of its applications.

3.1 INTRODUCTION TO THE FOURIER TRANSFORM

Let $f(x)$ be a continuous function of a real variable $x$. The *Fourier transform* of $f(x)$, denoted by $\mathfrak{F}\{f(x)\}$, is defined by the equation $$\mathfrak{F}\{f(x)\} = F(u) = \int_{-\infty}^{\infty} f(x) \exp[-j2\pi ux]\, dx, \tag{3.1-1}$$

where $j = \sqrt{-1}$.

Given $F(u)$, $f(x)$ can be obtained by using the *inverse Fourier trdnsform*

$$\begin{aligned}\mathfrak{F}^{-1}\{F(u)\} &= f(x)\\ &= \int_{-\infty}^{\infty} F(u) \exp[j2\pi ux]\, du.\end{aligned} \tag{3.1-2}$$

Equations (3.1-1) and (3.1-2), which are called the *Fourier transform pair*, can be shown to exist if $f(x)$ is continuous and integrable and $F(u)$ is integrable. These conditions are almost always satisfied in practice.

We will be concerned throughout this book with functions $f(x)$ that are real. The Fourier transform of a real function, however, is generally complex; that is, $$F(u) = R(u) + jI(u), \tag{3.1-3}$$

where $R(u)$ and $I(u)$ are, respectively, the real and imaginary components of $F(u)$. It is often convenient to express Eq. (3.1-3) in exponential form:

$$F(u) = |F(u)|e^{j\phi(u)}, \tag{3.1-4}$$

where $$|F(u)| = [R^2(u) + I^2(u)]^{1/2} \tag{3.1-5}$$

and $$\phi(u) = \tan^{-1}\left[\frac{I(u)}{R(u)}\right]. \tag{3.1-6}$$

The magnitude function $|F(u)|$ is called the *Fourier spectrum* of $f(x)$, and $\phi(u)$ its *phase angle*. The square of the spectrum, $$\begin{aligned}P(u) &= |F(u)|^2\\ &= R^2(u) + I^2(u)\end{aligned} \tag{3.1-7}$$

is commonly referred to as the *power spectrum* of $f(x)$. The term *spectral density* is also commonly used to denote the power spectrum.

The variable $u$ appearing in the Fourier transform is often called the *frequency variable*. This name arises from the fact that, using Euler's formula, the exponential term, $\exp[-j2\pi ux]$, may be expressed in the form:

$$\exp[-j2\pi ux] = \cos 2\pi ux - j \sin 2\pi ux. \tag{3.1-8}$$

If we interpret the integral in Eq. (3.1-1) as a limit-summation of discrete terms, it is evident that $F(u)$ is composed of an infinite sum of sine and cosine terms, and that each value of $u$ determines the *frequency* of its corresponding sine–cosine pair.

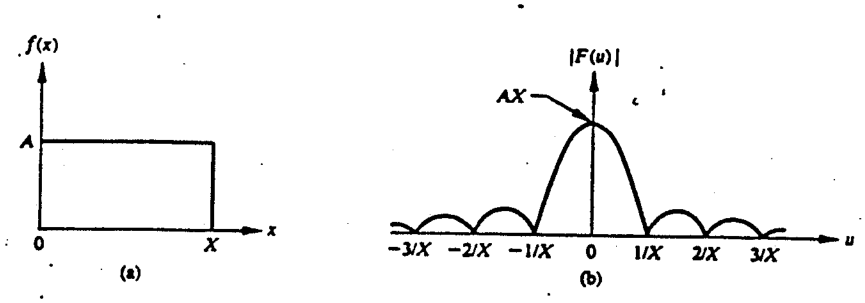

Figure 3.1 A simple function and its Fourier spectrum.

Example: Consider the simple function shown in Fig. 3.1(a). Its Fourier transform is obtained from Eq. (3.1-1) as follows:

$$\begin{aligned} F(u) &= \int_{-\infty}^{\infty} f(x)\exp[-j2\pi ux]\,dx \\ &= \int_0^X A\exp[-j2\pi ux]\,dx \\ &= \frac{-A}{j2\pi u}[e^{-j2\pi ux}]_0^X = \frac{-A}{j2\pi u}[e^{-j2\pi uX}-1] \\ &= \frac{A}{j2\pi u}[e^{j\pi uX}-e^{-j\pi uX}]e^{-j\pi uX} \\ &= \frac{A}{\pi u}\sin(\pi uX)\,e^{-j\pi uX}, \end{aligned}$$

which is a complex function. The Fourier spectrum is given by $$\begin{aligned} |F(u)| &= \left|\frac{A}{\pi u}\right| |\sin(\pi uX)|\,|e^{-j\pi uX}| \\ &= AX\left|\frac{\sin(\pi uX)}{(\pi uX)}\right|. \end{aligned}$$

A plot of $|F(u)|$ is shown in Fig. 3.1(b). □

The Fourier transform can be easily extended to a function $f(x, y)$ of two variables. If $f(x, y)$ is continuous and integrable, and $F(u, v)$ is integrable, we have that the following Fourier transform pair exists:

$$\mathfrak{F}\{f(x, y)\} = F(u, v) = \iint_{-\infty}^{\infty} f(x, y)\exp[-j2\pi(ux+vy)]\,dx\,dy \quad (3.1\text{-}9)$$

and $$\mathfrak{F}^{-1}\{F(u, v)\} = f(x, y) = \iint_{-\infty}^{\infty} F(u, v)\exp[j2\pi(ux+vy)]\,du\,dv, \quad (3.1\text{-}10)$$

where $u$ and $v$ are the frequency variables.

As in the one-dimensional case, the Fourier spectrum, phase, and power spectrum are, respectively, given by the relations:

$$|F(u, v)| = [R^2(u, v) + I^2(u, v)]^{1/2} \quad (3.1\text{-}11)$$

$$\phi(u, v) = \tan^{-1}\left[\frac{I(u, v)}{R(u, v)}\right] \quad (3.1\text{-}12)$$

and $$P(u, v) = |F(u, v)|^2 = R^2(u, v) + I^2(u, v). \quad (3.1\text{-}13)$$

Example: The Fourier transform of the function shown in Fig. 3.2(a) is given by $$\begin{aligned} F(u, v) &= \iint_{-\infty}^{\infty} f(x, y)\exp[-j2\pi(ux+vy)]\,dx\,dy \\ &= A\int_0^X \exp[-j2\pi ux]\,dx \int_0^Y \exp[-j2\pi vy]\,dy \\ &= A\left[\frac{e^{-j2\pi ux}}{-j2\pi u}\right]_0^X \left[\frac{e^{-j2\pi vy}}{-j2\pi v}\right]_0^Y \\ &= \frac{A}{-j2\pi u}[e^{-j2\pi uX}-1]\frac{1}{-j2\pi v}[e^{-j2\pi vY}-1] \\ &= AXY\left[\frac{\sin(\pi uX)\,e^{-j\pi uX}}{(\pi uX)}\right]\left[\frac{\sin(\pi vY)\,e^{-j\pi vY}}{(\pi vY)}\right]. \end{aligned}$$

The spectrum is given by $$|F(u, v)| = AXY\left|\frac{\sin(\pi uX)}{(\pi uX)}\right|\left|\frac{\sin(\pi vY)}{(\pi vY)}\right|.$$

A plot of this function is shown in Fig. 3.2(b) in three-dimensional perspective. Figure 3.2(c) shows the spectrum as an intensity function, where brightness is proportional to the amplitude of $|F(u, v)|$. Other examples of two-dimensional functions and their spectra are shown in Fig. 3.3. In this case, both $f(x, y)$ and $|F(u, v)|$ are shown as images. □

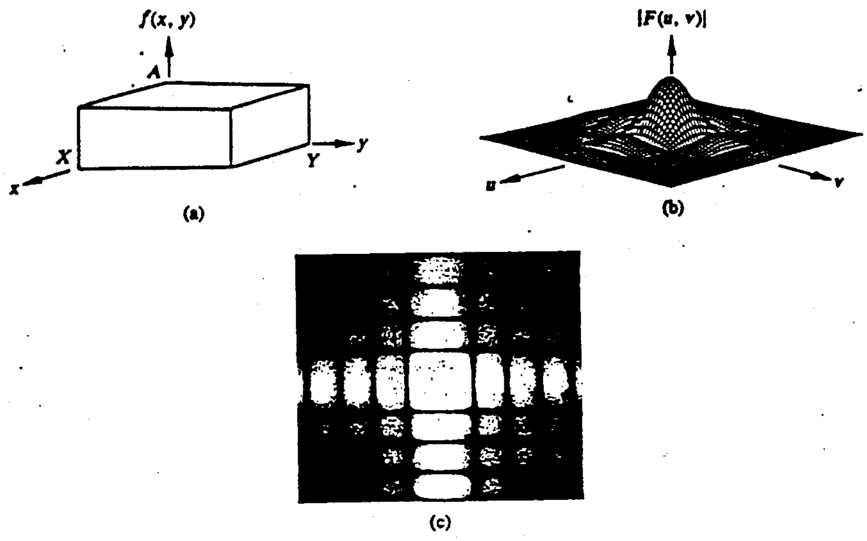

Figure 3.2 (a) A two-dimensional function, (b) its Fourier spectrum, and (c) the spectrum displayed as an intensity function.

3.2 THE DISCRETE FOURIER TRANSFORM

Suppose that a continuous function $f(x)$ is discretized into a sequence $\{f(x_0), f(x_0 + \Delta x), f(x_0 + 2\Delta x), \ldots, f(x_0 + [N-1]\Delta x)\}$ by taking $N$ samples $\Delta x$ units apart, as shown in Fig. 3.4. It will be convenient in subsequent developments to use $x$ as either a discrete or continuous variable, depending on the context of the discussion. We may do this by defining $$f(x) = f(x_0 + x\,\Delta x), \tag{3.2-1}$$

where $x$ now assumes the discrete values $0, 1, 2, \ldots, N-1$. In other words, the sequence $\{f(0), f(1), f(2), \ldots, f(N-1)\}$ will be used to denote *any* $N$ uniformly spaced samples from a corresponding continuous function.

With the above notation in mind, we have that the *discrete* Fourier transform pair that applies to sampled functions is given by†

$$F(u) = \frac{1}{N}\sum_{x=0}^{N-1} f(x)\exp[-j2\pi ux/N] \tag{3.2-2}$$

† A proof of these results is outside the scope of this discussion. Proofs relating the continuous and discrete Fourier transforms can be found in Blackman and Tukey [1958]; Cooley, Lewis, and Welch [1967]; and Brigham [1974].

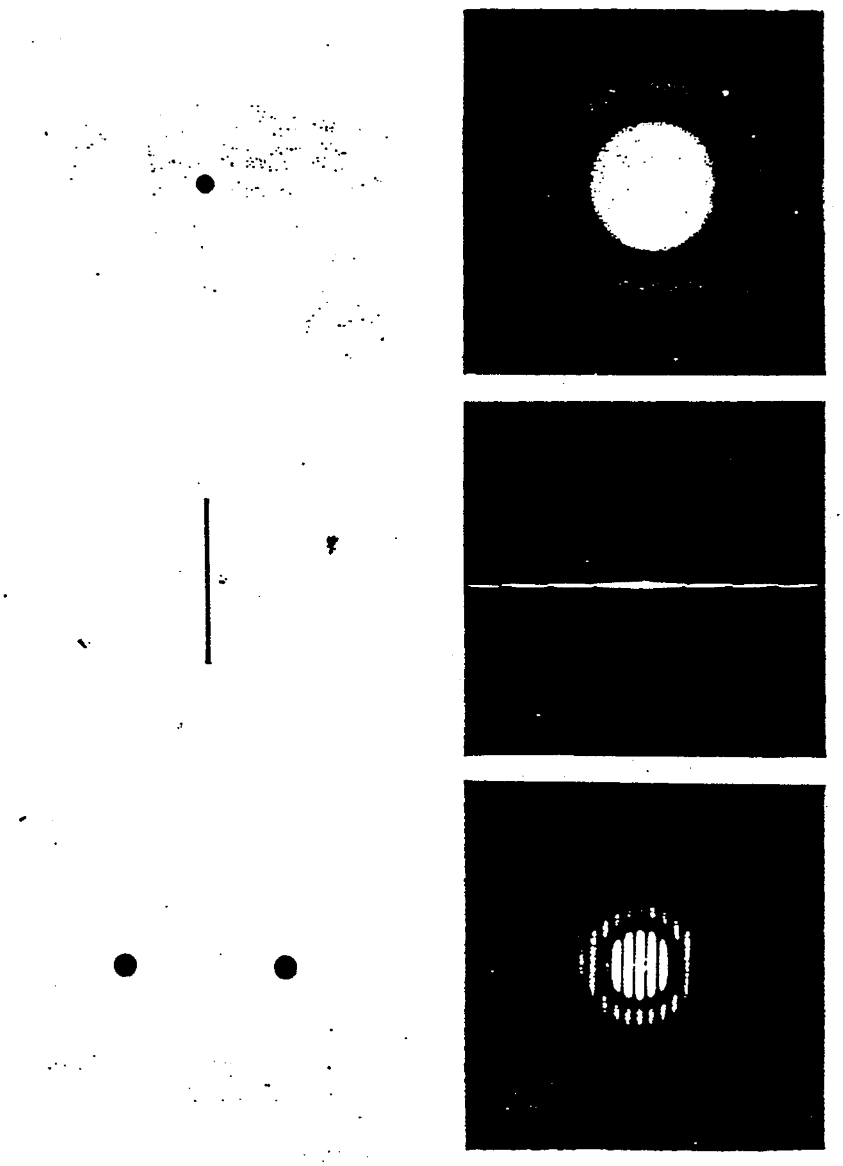
Figure 3.3 Some two-dimensional functions and their Fourier spectra.

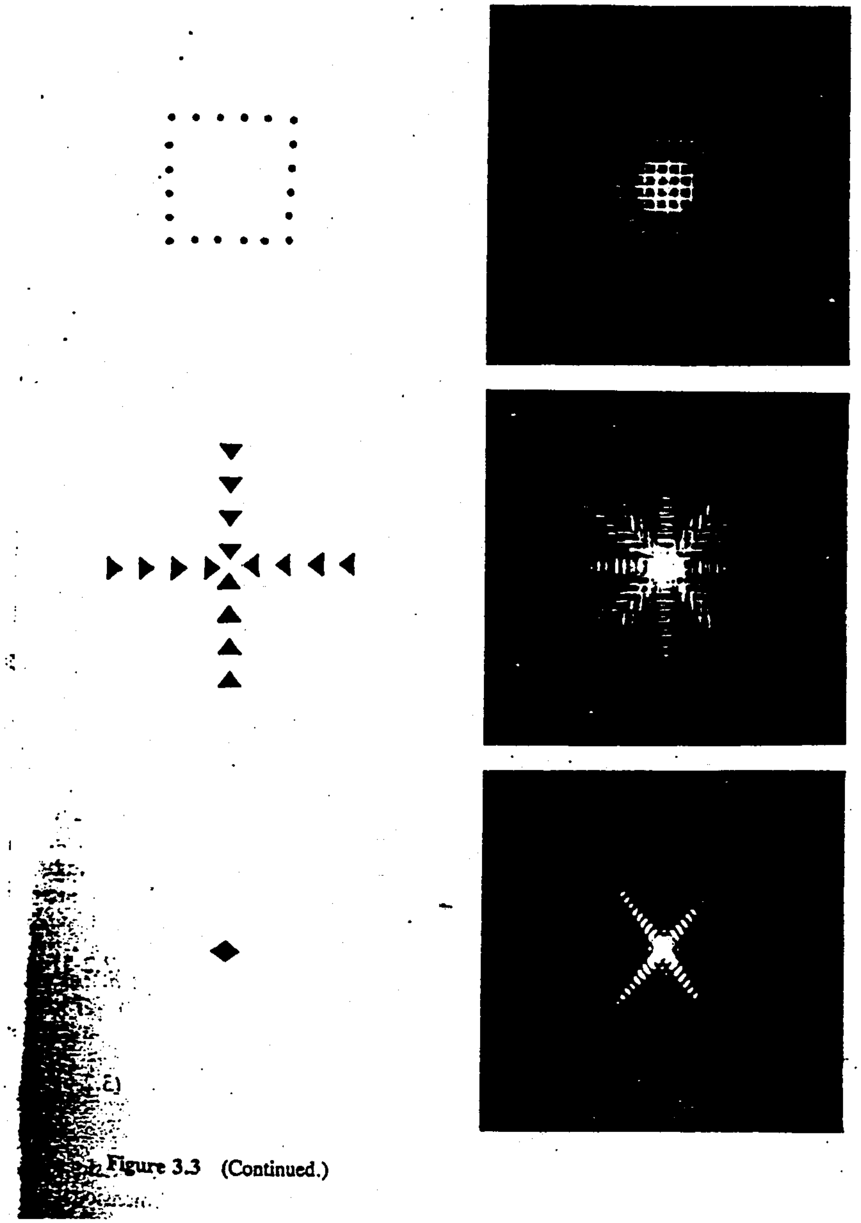
Figure 3.3 (Continued.)

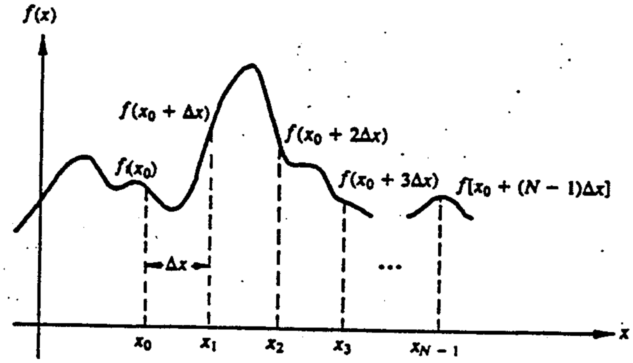

Figure 3.4 Sampling a continuous function.

for $u = 0, 1, 2, \ldots, N-1$, and $$f(x) = \sum_{u=0}^{N-1} F(u) \exp[j2\pi ux/N] \qquad (3.2\text{-}3)$$

for $x = 0, 1, 2, \ldots, N-1$.

The values $u = 0, 1, 2, \ldots, N-1$ in the discrete Fourier transform given in Eq. (3.2-2) correspond to samples of the continuous transform at values 0, $\Delta u$, $2\Delta u$, . . . , $(N-1)\Delta u$. In other words, we are letting $F(u)$ represent $F(u\Delta u)$. This notation is similar to that used for the discrete $f(x)$, with the exception that the samples of $F(u)$ start at the origin of the frequency axis. It can be shown that $\Delta u$ and $\Delta x$ are related by the expression $$\Delta u = \frac{1}{N\Delta x}. \qquad (3.2\text{-}4)$$

In the two-variable case the discrete Fourier transform pair is given by the equations $$F(u, v) = \frac{1}{MN} \sum_{x=0}^{M-1} \sum_{y=0}^{N-1} f(x, y) \exp[-j2\pi(ux/M + vy/N)] \qquad (3.2\text{-}5)$$

for $u = 0, 1, 2, \ldots, M-1$, $v = 0, 1, 2, \ldots, N-1$, and $$f(x, y) = \sum_{u=0}^{M-1} \sum_{v=0}^{N-1} F(u, v) \exp[j2\pi(ux/M + vy/N)] \qquad (3.2\text{-}6)$$

for $x = 0, 1, 2, \ldots, M-1$ and $y = 0, 1, 2, \ldots, N-1$.

Sampling of a continuous function is now in a two-dimensional grid with divisions of width $\Delta x$ and $\Delta y$ in the $x$ and $y$ axis, respectively. As in the one-dimensional case, the discrete function $f(x, y)$ represents samples of the function $f(x_0 + x\Delta x, y_0 + y\Delta y)$ for $x = 0, 1, 2, \ldots, M-1$ and $y = 0, 1, 2, \ldots, N-1$. Similar comments hold for $F(u, v)$. The sampling increments in the spatial and frequency domains are related by $$\Delta u = \frac{1}{M\Delta x} \qquad (3.2\text{-}7)$$

and $$\Delta v = \frac{1}{N\Delta y}. \qquad (3.2\text{-}8)$$

When images are sampled in a square array we have that $M = N$ and $$F(u, v) = \frac{1}{N} \sum_{x=0}^{N-1} \sum_{y=0}^{N-1} f(x, y) \exp[-j2\pi(ux + vy)/N] \qquad (3.2\text{-}9)$$

for $u, v = 0, 1, 2, \ldots, N-1$, and $$f(x, y) = \frac{1}{N} \sum_{u=0}^{N-1} \sum_{v=0}^{N-1} F(u, v) \exp[j2\pi(ux + vy)/N] \qquad (3.2\text{-}10)$$

for $x, y = 0, 1, 2, \ldots, N-1$. Note that in this case we have included a $1/N$ term in both expressions. Since $F(u, v)$ and $f(x, y)$ are a Fourier transform pair, the grouping of these constant multiplicative terms is arbitrary. In practice, images are typically digitized in square arrays, so we will be mostly concerned with the Fourier transform pair given in Eqs. (3.2-9) and (3.2-10). The formulation given in Eqs. (3.2-5) and (3.2-6) will be used from time to time in situations where it is important to stress generality of the image size.

The Fourier spectrum, phase, and energy spectrum of one- and two-dimensional discrete functions are also given by Eqs. (3.1-5) through (3.1-7) and Eqs. (3.1-11) through (3.1-13), respectively. The only difference is that the independent variables are discrete.

Unlike the continuous case, we need not be concerned about the existence of the discrete Fourier transform since both $F(u)$ and $F(u, v)$ always exist in the discrete case. In the one-dimensional case, for example, this can be shown by direct substitution of Eq. (3.2-3) into Eq. (3.2-2):

$$\begin{aligned} F(u) &= \frac{1}{N} \sum_{x=0}^{N-1} \left[ \sum_{r=0}^{N-1} F(r) \exp[j2\pi rx/N] \exp[-j2\pi ux/N] \right] \\ &= \frac{1}{N} \sum_{r=0}^{N-1} F(r) \left[ \sum_{x=0}^{N-1} \exp[j2\pi rx/N] \exp[-j2\pi ux/N] \right] \qquad (3.2\text{-}11) \\ &= F(u). \end{aligned}$$

Identity (3.2-11) follows from the orthogonality condition $$\sum_{x=0}^{N-1} \exp[j2\pi rx/N] \exp[-j2\pi ux/N] = \begin{cases} N & \text{if } r = u, \\ 0 & \text{otherwise.} \end{cases} \qquad (3.2\text{-}12)$$

Note that a change of variable from $u$ to $r$ was made in Eq. (3.2-2) to clarify the notation.

Substitution of Eq. (3.2-2) into Eq. (3.2-3) would also yield an identity on $f(x)$, thus indicating that the Fourier transform pair given by these equations always exists. A similar argument holds for the discrete, two-dimensional Fourier transform pair.

Example: As an illustration of Eqs. (3.2-2) and (3.2-3), consider the function shown in Fig. 3.5(a). If this function is sampled at the argument values $x_0 = 0.5$, $x_1 = 0.75$, $x_2 = 1.0$, and $x_3 = 1.25$, and if the argument is redefined as discussed above, we obtain the discrete function shown in Fig. 3.5(b).

Application of Eq. (3.2-2) to the resulting four samples yields the following sequence of steps:

$$\begin{aligned} F(0) &= \frac{1}{4} \sum_{x=0}^{3} f(x) \exp[0] \\ &= \frac{1}{4} [f(0) + f(1) + f(2) + f(3)] \\ &= \frac{1}{4} [2 + 3 + 4 + 4] \\ &= 3.25. \end{aligned}$$

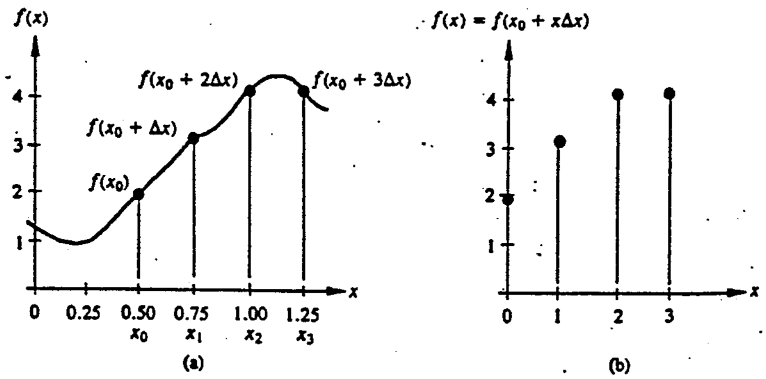

Figure 3.5 A simple function and samples in the $x$ domain. In (a) $x$ is a continuous variable; in (b) $x$ is discrete.

$$\begin{aligned} F(1) &= \frac{1}{4}\sum_{x=0}^{3} f(x)\exp[-j2\pi x/4] \\ &= \frac{1}{4}[2e^0 + 3e^{-j\pi/2} + 4e^{-j\pi} + 4e^{-j3\pi/2}] \\ &= \frac{1}{4}[-2 + j], \end{aligned}$$

where the last step follows from Euler's formula. Continuing with this procedure, we obtain $$\begin{aligned} F(2) &= \frac{1}{4}\sum_{x=0}^{3} f(x)\exp[-j4\pi x/4] \\ &= \frac{1}{4}[2e^0 + 3e^{-j\pi} + 4e^{-j2\pi} + 4e^{-j3\pi}] \\ &= -\frac{1}{4}[1 + j0] \end{aligned}$$

and $$\begin{aligned} F(3) &= \frac{1}{4}\sum_{x=0}^{3} f(x)\exp[-j6\pi x/4] \\ &= \frac{1}{4}[2e^0 + 3e^{-j3\pi/2} + 4e^{-j3\pi} + 4e^{-j9\pi/2}] \\ &= -\frac{1}{4}[2 + j]. \end{aligned}$$

It is noted that all values of $f(x)$ contribute to each of the four terms of the discrete Fourier transform. Conversely, all terms of the transform contribute in forming the inverse transform via Eq. (3.2-3). The procedure for obtaining the inverse is analogous to the one described above for computing $F(u)$.

The Fourier spectrum is obtained from the magnitude of each of the transform terms; that is, $$\begin{aligned} |F(0)| &= 3.25, \\ |F(1)| &= [(2/4)^2 + (1/4)^2]^{1/2} = \sqrt{5}/4, \\ |F(2)| &= [(1/4)^2 + (0/4)^2]^{1/2} = 1/4, \\ |F(3)| &= [(2/4)^2 + (1/4)^2]^{1/2} = \sqrt{5}/4. \end{aligned}$$

□

3.3 SOME PROPERTIES OF THE TWO-DIMENSIONAL FOURIER TRANSFORM

Attention is focused in this section on properties of the Fourier transform that will be of value in subsequent discussions. Although our primary interest is in two-dimensional, discrete transforms, the underlying concepts of some of these properties are much easier to grasp if they are presented first in their one-dimensional, continuous form.

Since several of the topics considered in this section are illustrated by images and their Fourier spectra displayed as intensity functions, some comments concerning these displays are in order before beginning a discussion of Fourier transform properties. Many image spectra decrease rather rapidly as a function of increasing frequency and therefore their high-frequency terms have a tendency to become obscured when displayed in image form. A useful processing technique that compensates for this difficulty consists of displaying the function $$D(u, v) = \log(1 + |F(u, v)|) \tag{3.3-1}$$

instead of $|F(u, v)|$. Use of this equation preserves the zero values in the frequency plane since $D(u, v) = 0$ when $|F(u, v)| = 0$. It is also noted that $D(u, v)$ is a nonnegative function.

As an illustration of the properties of the preceding logarithmic transformation, consider the Fourier spectra shown in Fig. 3.6. Part (a) of this figure is the spectrum of a pulse of unit width and height (see Fig. 3.1). Figure 3.6(b) shows the effect of using Eq. (3.3-1) and rescaling the results to the amplitude interval [0, 1]. It is noted that, although the peak value is still 1, the amplitude of the side lobes has increased slightly. The effect is more pronounced in Figs. 3.6(c) and (d), where the maximum amplitude of $|F(u)|$ is assumed to be 20 instead of 1. In Fig. 3.6(d), which was rescaled after taking the log, the ratio of the central peak to the peak of any of the side lobes is much smaller than the corresponding ratio in Fig. 3.6(b). If one considers the amplitude of these functions as being proportional to intensity, it is evident that the side lobes of Fig. 3.6(d) would be more visible than those in Fig. 3.6(b).

The degree of amplitude equalization achieved by using Eq. (3.3-1) depends on the relative magnitude of the function $|F(u, v)|$, as illustrated in Fig. 3.6. In the one-dimensional case, the behavior of the ratio of the maximum to some minimum (nonzero) value of $F(u)$ as a function of amplitude can be examined by using the relation $$R = \frac{\log(1 + KF_{max})}{\log(1 + KF_{min})}, \tag{3.3-2}$$

where $K$ is a scale factor.

Suppose, for example, that we consider the ratio of $F_{max} = 1.0$ to the peak of the first side lobe in Fig. 3.6(a). In this case, $F_{min} = 0.2$ and $F_{max}/F_{min} = 5.0$. In

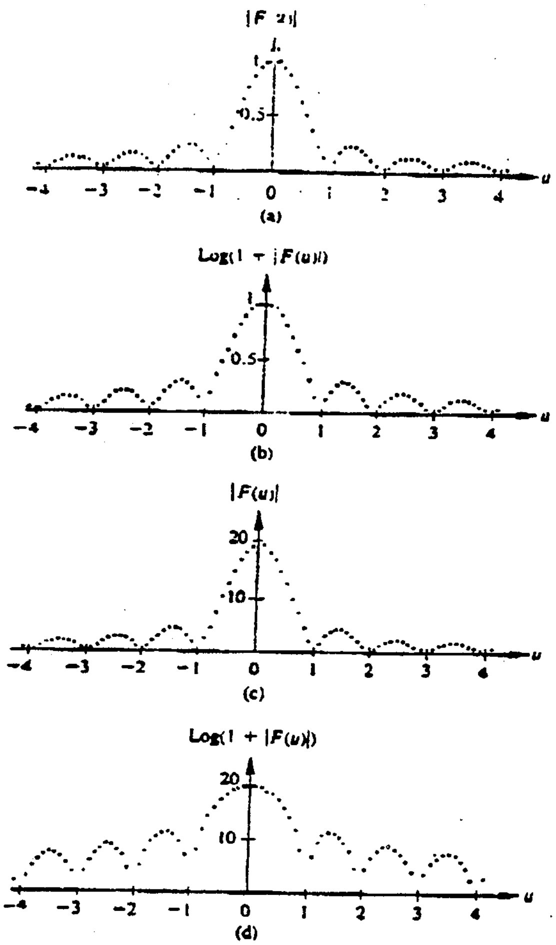

Figure 3.6 Effect of the log operation on a Fourier spectrum.

Fig. 3.6(b), on the other hand, use of the log operation yields the ratio log(1 + $F_{max}$)/log(1 + $F_{min}$) = 3.8. Figure 3.6(c) is the same as Fig. 3.6(a), with the exception that all values have been multiplied by a scale factor of 20. Since the scale factor is the same for all values, the ratio $F_{max}/F_{min}$ is again equal to 5.0. When the log is taken, however, we have the ratio log(1 + 20 $F_{max}$)/log(1 + 20 $F_{min}$) = 1.9, which is substantially smaller. The general behavior of $R$ as a function of $K$ is illustrated in Fig. 3.7 for the above values of $F_{max}$ and $F_{min}$. It is noted that the ratio decreases rather quickly at first, but it levels off for values of $K$ greater than about 40.

Use of Eq. (3.3-1) in a two-dimensional display of the spectrum greatly facilitates visual interpretation of the Fourier transform. An example of this is given in Fig. 3.8, which shows a picture of the planet Saturn, its normal spectrum, and the spectrum processed by adding 1 to $|F(u, v)|$, taking the log, and rescaling the values to the same gray scale used in displaying $|F(u, v)|$. By equalizing the range of values in the spectrum, use of the log operation clearly brings out low-level information that, if shown simply as $|F(u, v)|$, is beyond the dynamic range of the display system. Most Fourier spectra shown in image form throughout this book were processed using Eq. (3.3-1).

3.3.1 Separability

The discrete Fourier transform pair given in Eqs. (3.2-9) and (3.2-10) can be expressed in the separable forms $$F(u,v) = \frac{1}{N}\sum_{x=0}^{N-1} \exp[-j2\pi ux/N] \sum_{y=0}^{N-1} f(x,y) \exp[-j2\pi vy/N] \qquad (3.3\text{-}3)$$

for $u, v = 0, 1, \ldots, N-1$, and $$f(x,y) = \frac{1}{N}\sum_{u=0}^{N-1} \exp[j2\pi ux/N] \sum_{v=0}^{N-1} F(u,v) \exp[j2\pi vy/N] \qquad (3.3\text{-}4)$$

for $x, y = 0, 1, \ldots, N-1$.

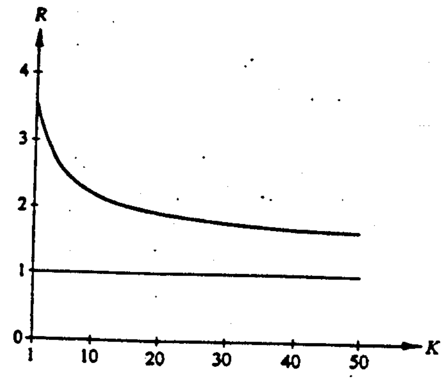

Figure 3.7 Behavior of Eq. (3.3–2) as a function of $K$ for $F_{max} = 1.0$ and $F_{min} = 0.2$.

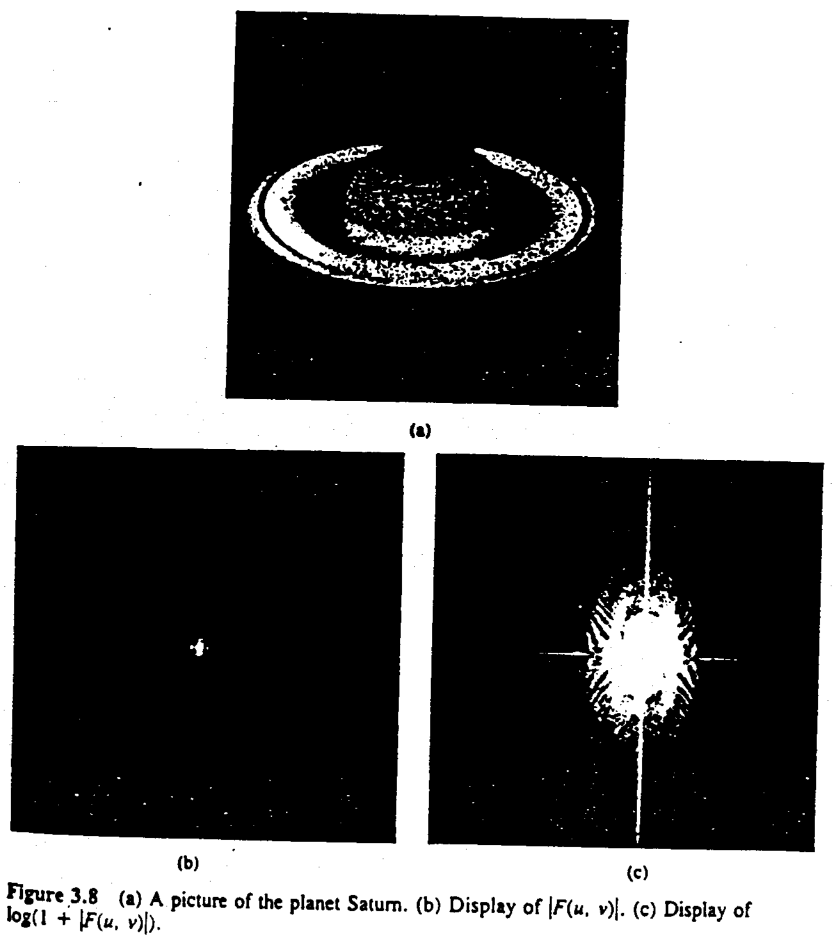

(a)

(b)

(c)

Figure 3.8 (a) A picture of the planet Saturn. (b) Display of $|F(u, v)|$. (c) Display of $\log(1 + |F(u, v)|)$.

For our purposes, the principal advantage of the separability property is that $F(u, v)$ or $f(x, y)$ can be obtained in two steps by successive applications of the one-dimensional Fourier transform or its inverse. This becomes evident if Eq. (3.3-3) is expressed in the form $$F(u, v) = \frac{1}{N}\sum_{x=0}^{N-1} F(x, v)\exp[-j2\pi ux/N], \qquad (3.3\text{-}5)$$

where $$F(x, v) = N\left[\frac{1}{N}\sum_{y=0}^{N-1} f(x, y)\exp[-j2\pi vy/N]\right]. \qquad (3.3\text{-}6)$$

For *each* value of $x$, the expression inside the brackets is a one-dimensional transform with frequency values $v = 0, 1, \ldots, N-1$. Therefore the two-dimensional function $F(x, v)$ is obtained by taking a transform along *each* row of $f(x, y)$ and multiplying the result by $N$. The desired result, $F(u, v)$, is then obtained by taking a transform along each column of $F(x, v)$, as indicated by Eq. (3.3-5). The procedure is summarized in Fig. 3.9. It should be noted that the same results would be obtained by first taking transforms along the columns of $f(x, y)$ and then along the rows of the result. This is easily shown by reversing the order of the summations of Eq. (3.3-3). Identical comments hold for the implementation of Eq. (3.3-4).

3.3.2 Translation

The translation properties of the Fourier transform pair are given by $$f(x,y)\exp[j2\pi(u_0x + v_0y)/N] \Leftrightarrow F(u - u_0, v - v_0) \qquad (3.3\text{-}7a)$$

and $$f(x - x_0, y - y_0) \Leftrightarrow F(u, v)\exp[-j2\pi(ux_0 + vy_0)/N], \qquad (3.3\text{-}7b)$$

where the double arrow is used to indicate the correspondence between a function and its Fourier transform (and vice versa), as given in Eqs. (3.1-9) and (3.1-10) or Eqs. (3.2-9) and (3.2-10).

Equation (3.3-7a) shows that multiplying $f(x, y)$ by the indicated exponential term and taking the transform of the product results in a shift of the origin of the frequency plane to the point $(u_0, v_0)$. Similarly, multiplying $F(u, v)$ by the exponential term shown and taking the inverse transform moves the origin of the spatial plane to $(x_0, y_0)$.

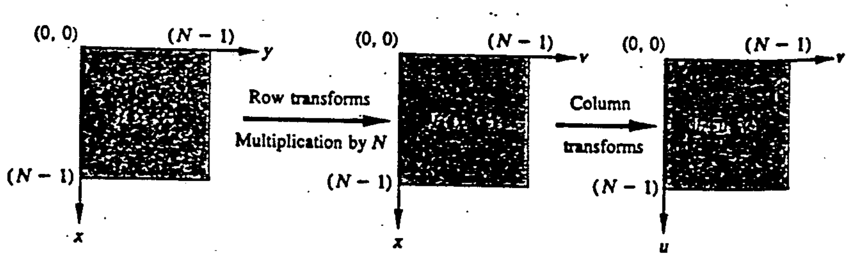

Figure 3.9 Computation of the two-dimensional Fourier transform as a series of one-dimensional transforms.

In this and the next chapter we will make considerable use of Eq. (3.3-7a), with $u_0 = v_0 = N/2$. In this case it follows that $$\begin{aligned}\exp[j2\pi(u_0x + v_0y)/N] &= e^{j\pi(x+y)}\\ &= (-1)^{x+y}\end{aligned}$$

and $$f(x, y)(-1)^{x+y} \Leftrightarrow F(u - N/2, v - N/2). \qquad (3.3\text{-}8)$$

Thus the origin of the Fourier transform of $f(x, y)$ can be moved to the center of its corresponding $N \times N$ frequency square simply by multiplying $f(x, y)$ by $(-1)^{x+y}$. In the one-variable case this reduces to multiplication of $f(x)$ by the term $(-1)^x$.

It is interesting to note from Eq. (3.3-7b) that a shift in $f(x, y)$ does not affect the magnitude of its Fourier transform, since $$|F(u, v) \exp[-j2\pi(ux_0 + vy_0)/N]| = |F(u, v)|. \quad (3.3\text{-}9)$$

This should be kept in mind since visual examination of the transform is usually limited to a display of its magnitude.

3.3.3 Periodicity and Conjugate Symmetry

The discrete Fourier transform and its inverse are *periodic* with period $N$; that is, $$F(u, v) = F(u + N, v) = F(u, v + N) = F(u + N, v + N). \quad (3.3\text{-}10)$$

The validity of this property can be demonstrated by direct substitution of the variables of $(u + N)$ and $(v + N)$ in Eq. (3.2-9). Although Eq. (3.3-10) points out that $F(u, v)$ repeats itself for an infinite number of values of $u$ and $v$, only the $N$ values of each variable in any one period are required to obtain $f(x, y)$ from $F(u, v)$. In other words, only one period of the transform is necessary to completely specify $F(u, v)$ in the frequency domain. Similar comments hold for $f(x, y)$ in the spatial domain.

If $f(x, y)$ is real, the Fourier transform also exhibits conjugate symmetry since, in this case, $$F(u, v) = F^*(-u, -v) \quad (3.3\text{-}11)$$

or, more interestingly, $$|F(u, v)| = |F(-u, -v)|. \quad (3.3\text{-}12)$$

As mentioned earlier, it is often of interest to display the magnitude of the Fourier transform for interpretation purposes. In order to examine the implications of Eqs. (3.3-10) and (3.3-12) on a display of the transform magnitude, let us first consider the one-variable case, where $$F(u) = F(u + N)$$

and $$|F(u)| = |F(-u)|.$$

The periodicity property indicates that $F(u)$ has a period of length $N$, and the symmetry property shows that the magnitude of the transform is centered about the origin, as shown in Fig. 3.10(a). It is evident from this figure and the above comments that the magnitudes of the transform values from $([N/2] + 1)$ to $(N - 1)$ are images of the values in the half period on the left side of the origin. Since the discrete Fourier transform has been formulated for values of $u$ in the interval $[0, N - 1]$, we see that the result of this formulation yields two back to back half periods in this interval. To display one full period, all that is necessary is to move the origin of the transform to the point $u = N/2$, as shown in Fig. 3.10(b). This is easily accomplished by multiplying $f(x)$ by $(-1)^x$ prior to taking the transform, as indicated earlier.

The same observations hold for the magnitude of the two-dimensional Fourier transform, with the exception that the results are considerably more difficult to interpret if the origin of the transform is not shifted to the frequency point $(N/2, N/2)$. This is shown in Figs. 3.11(b) and (c), where the latter figure was obtained by using the centering property of expression (3.3-8).

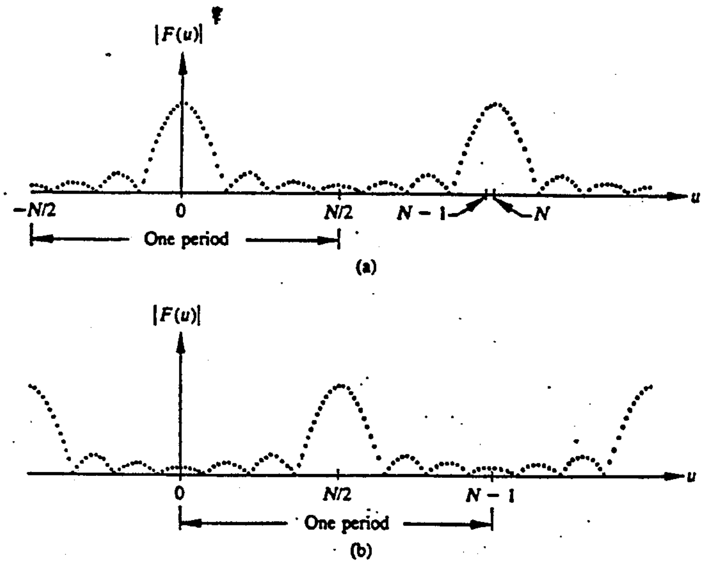

Figure 3.10 Illustration of the periodicity properties of the Fourier transform. (a) Fourier spectrum showing back-to-back half periods in the interval $[0, N-1]$. (b) Shifted spectrum showing a full period in the same interval.

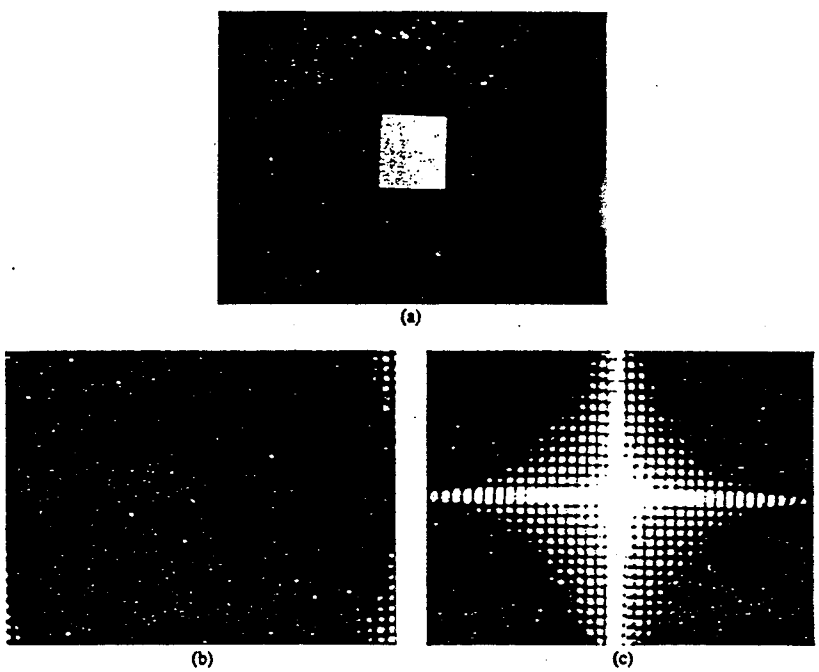

Figure 3.11 (a) A simple image. (b) Fourier spectrum without shifting. (c) Fourier spectrum shifted to the center of the frequency square.

3.3.4 Rotation

If we introduce the polar coordinates $$x = r\cos\theta \qquad y = r\sin\theta \qquad u = \omega\cos\phi \qquad v = \omega\sin\phi$$

then $f(x, y)$ and $F(u, v)$ become $f(r, \theta)$ and $F(\omega, \phi)$, respectively. It can be shown by direct substitution in either the continuous or discrete Fourier transform pair that $$f(r, \theta + \theta_0) \Leftrightarrow F(\omega, \phi + \theta_0). \qquad (3.3\text{-}13)$$

In other words, if $f(x, y)$ is rotated by an angle $\theta_0$, then $F(u, v)$ is rotated by the same angle. Similarly, rotating $F(u, v)$ causes $f(x, y)$ to be rotated by the same angle. This property is illustrated in Fig. 3.12.

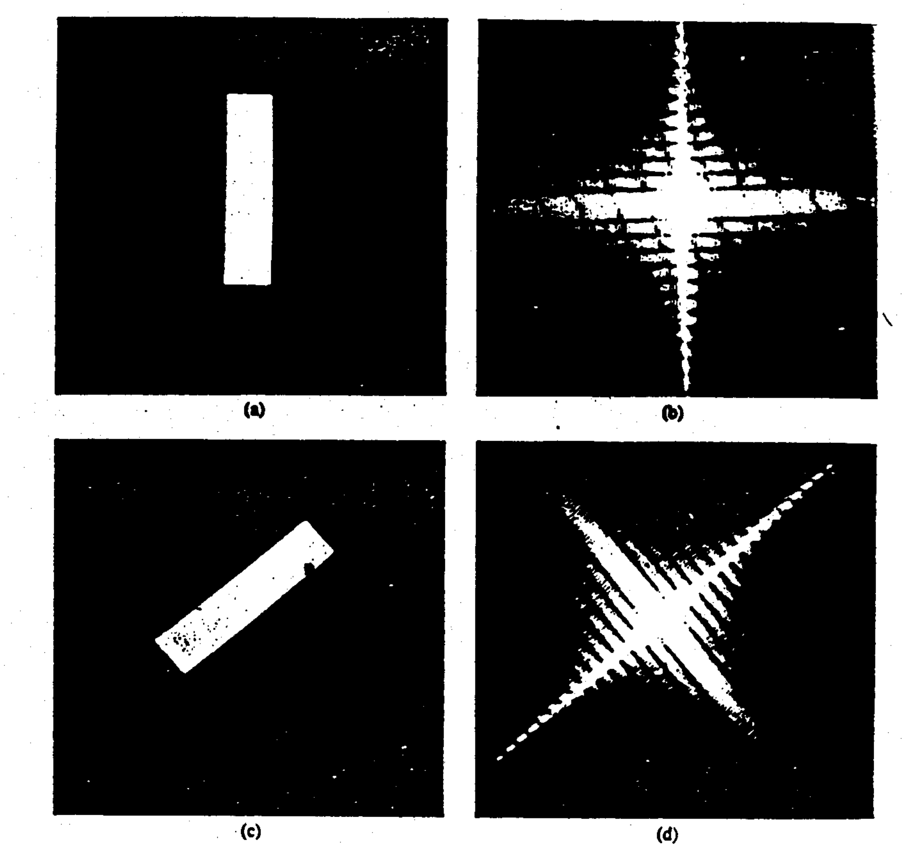

Figure 3.12 Rotational properties of the Fourier transform. (a) A simple image. (b) Spectrum. (c) Rotated image. (d) Resulting spectrum.

3.3.5 Distributivity and Scaling

It follows directly from the definition of the continuous or discrete transform pair that $$\mathfrak{F}\{f_1(x, y) + f_2(x, y)\} = \mathfrak{F}\{f_1(x, y)\} + \mathfrak{F}\{f_2(x, y)\} \qquad (3.3\text{-}14)$$

and, in general, that $$\mathfrak{F}\{f_1(x, y) \cdot f_2(x, y)\} \neq \mathfrak{F}\{f_1(x, y)\} \cdot \mathfrak{F}\{f_2(x, y)\}. \qquad (3.3\text{-}15)$$

In other words, the Fourier transform and its inverse are distributive over addition, but not over multiplication.

It is also easy to show that for two scalars $a$ and $b$, $$af(x, y) \Leftrightarrow aF(u, v) \qquad (3.3\text{-}16)$$

and $$f(ax, by) \Leftrightarrow \frac{1}{|ab|} F(u/a, v/b). \qquad (3.3\text{-}17)$$

3.3.6 Average Value

A widely used definition of the average value of a two-dimensional discrete function is given by the expression $$\bar{f}(x, y) = \frac{1}{N^2} \sum_{x=0}^{N-1} \sum_{y=0}^{N-1} f(x, y). \qquad (3.3\text{-}18)$$

Substitution of $u = v = 0$ in Eq. (3.2-9) yields $$F(0, 0) = \frac{1}{N}\sum_{x=0}^{N-1}\sum_{y=0}^{N-1} f(x, y). \tag{3.3-19}$$

Therefore we see that $\bar{f}(x, y)$ is related to the Fourier transform of $f(x, y)$ by the equation $$\bar{f}(x, y) = \frac{1}{N}F(0, 0). \tag{3.3-20}$$

3.3.7 Laplacian

The Laplacian of a two-variable function $f(x, y)$ is defined as $$\nabla^2 f(x, y) = \frac{\partial^2 f}{\partial x^2} + \frac{\partial^2 f}{\partial y^2}. \tag{3.3-21}$$

It follows from the definition of the two-dimensional Fourier transform that $$\mathfrak{F}\{\nabla^2 f(x, y)\} \Leftrightarrow -(2\pi)^2(u^2 + v^2)F(u, v). \tag{3.3-22}$$

The Laplacian operator is useful for outlining edges in an image.

3.3.8 Convolution and Correlation

In this section we consider two Fourier transform relationships that constitute a basic link between the spatial and frequency domains. These relationships, called convolution and correlation, are of fundamental importance in developing a firm understanding of image processing techniques based on the Fourier transform. In order to clarify the concepts involved, we begin the discussion by considering convolution in one dimension and with continuous arguments. The development is then extended to the discrete case and, finally, to the two-dimensional continuous and discrete cases. The same format is followed in developing the concept of correlation.

Convolution

The convolution of two functions $f(x)$ and $g(x)$, denoted by $f(x)*g(x)$, is defined by the integral $$f(x)*g(x) = \int_{-\infty}^{\infty} f(\alpha)g(x - \alpha)\, d\alpha, \tag{3.3-23}$$

where $\alpha$ is a dummy variable of integration. Since the mechanics of the convolution integral are not particularly easy to visualize, let us illustrate graphically the use of Eq. (3.3-23) by two simple examples.

Example: The first example demonstrates convolution of the functions $f(x)$ and $g(x)$ shown in Figs. 3.13(a) and (b), respectively. Before carrying out the integration, it is necessary to form the function $g(x - \alpha)$. This is shown in two steps in Figs. 3.13(c) and (d). It is noted that this operation is simply one of folding $g(\alpha)$ about the origin to give $g(-\alpha)$ and then displacing this function by $x$. Then, for any given value of $x$, we multiply $f(\alpha)$ by the corresponding $g(x - \alpha)$ and integrate the product from $-\infty$ to $\infty$. The product of $f(\alpha)$ and $g(x - \alpha)$ is the shaded portion of Fig. 3.13(e). This figure is valid for $0 \le x \le 1$. Since the product is 0 for values of $\alpha$ outside the interval $[0, x]$, we find that $f(x)*g(x) = x/2$, which is simply the area of the shaded region in Fig. 3.13(e). For $x$ in the interval $[1, 2]$ we use Fig. 3.13(f). In this case, $f(x)*g(x) = (1 - x/2)$. Thus by noting that $f(\alpha)g(x - \alpha)$ is zero for values of $x$ outside the interval $[0, 2]$, we have $$f(x)*g(x) = \begin{cases} x/2 & 0 \le x \le 1 \\ 1 - x/2 & 1 \le x \le 2 \\ 0 & \text{elsewhere} \end{cases}$$

The result is shown in Fig. 3.13(g). □

One aspect of Eq. (3.3-23), which will be of use later in this section, involves the convolution of a function $f(x)$ with the impulse function $\delta(x - x_0)$, which is defined by the relation $$\int_{-\infty}^{\infty} f(x)\,\delta(x - x_0)\, dx = f(x_0). \tag{3.3-24}$$

The function $\delta(x - x_0)$ may be viewed as having an area of unity in an infinitesimal neighborhood about $x_0$ and being 0 everywhere else; that is, $$\int_{-\infty}^{\infty} \delta(x - x_0)\, dx = \int_{x_0^-}^{x_0^+} \delta(x - x_0)\, dx = 1. \qquad (3.3\text{-}25)$$

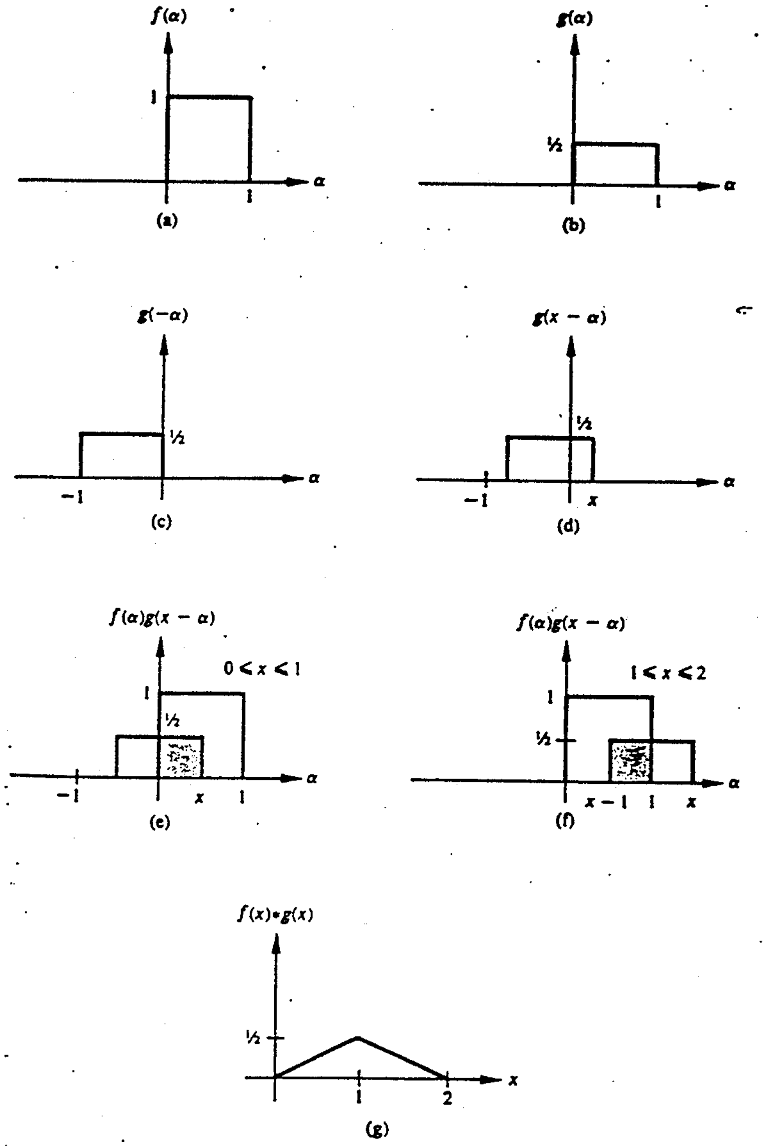

Figure 3.13 Graphical illustration of convolution. The shaded areas indicate regions where the product is not zero.

For most purposes we can say that $\delta(x - x_0)$ is located at $x = x_0$, and that the *strength* of the impulse is determined by the value of $f(x)$ at $x = x_0$. For instance, if $f(x) = A$, we have that $A\delta(x - x_0)$ is an impulse of strength $A$ located at $x = x_0$. It is common practice to represent impulses graphically by an arrow located at $x_0$ and with height equal to the impulse strength. Figure 3.14 shows this representation for $A\delta(x - x_0)$.

Example: As a second illustration of the use of Eq. (3.3-23), suppose that the function $f(x)$ shown in Fig. 3.15(a) is convolved with the function $g(x) = \delta(x + T) + \delta(x) + \delta(x - T)$ shown in Fig. 3.15(b). By folding $g(x)$, sliding it past $f(x)$, and making use of Eqs. (3.3-23) and (3.3-24), we obtain the result shown in Fig. 3.15(c). It is noted that convolution in this case amounts merely to "copying" $f(x)$ at the location of each impulse. □

The importance of convolution in frequency-domain analysis lies in the fact that $f(x)*g(x)$ and $F(u)G(u)$ constitute a Fourier transform pair. In other words, if $f(x)$ has the Fourier transform $F(u)$ and $g(x)$ has the Fourier transform $G(u)$, then $f(x)*g(x)$ has the Fourier transform $F(u)G(u)$. This result, formally stated as $$f(x)*g(x) \Leftrightarrow F(u)G(u) \qquad (3.3\text{-}26)$$

indicates that convolution in the $x$-domain can also be obtained by taking the inverse Fourier transform of the product $F(u)G(u)$. An analogous result is that convolution in the frequency domain reduces to multiplication in the $x$ domain; that is $$f(x)g(x) \Leftrightarrow F(u)*G(u). \qquad (3.3\text{-}27)$$

These two results are commonly referred to as the *convolution theorem*.

Suppose that instead of being continuous, $f(x)$ and $g(x)$ are discretized into sampled arrays of size $A$ and $B$, respectively: $\{f(0), f(1), f(2), \ldots, f(A-1)\}$, and $\{g(0), g(1), g(2), \ldots, g(B-1)\}$. As pointed out in Section 3.3.3, the discrete Fourier transform and its inverse are periodic functions. In order to formulate a discrete convolution theorem that is consistent with this periodicity property, we may assume that the discrete functions $f(x)$ and $g(x)$ are periodic with some period $M$. The resulting convolution will then be periodic with the same period. The problem

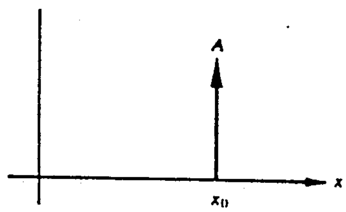

Figure 3.14 Graphical representation of $A\delta(x - x_0)$.

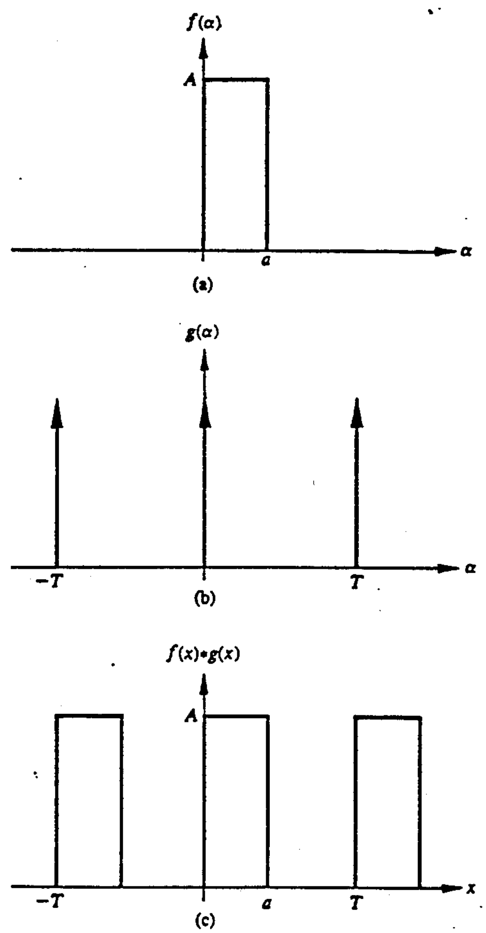

Figure 3.15 Convolution involving impulse functions.

is how to select a value for $M$. It can be shown (Brigham [1974]) that unless we choose $$M \geq A + B - 1 \tag{3.3-28}$$

the individual periods of the convolution will overlap; this overlap is commonly referred to as *wraparound error*. If $M = A + B - 1$, the periods will be adjacent; if $M > A + B - 1$, the periods will be spaced apart, with the degree of separation being equal to the difference between $M$ and $A + B - 1$. Since the assumed period must be greater than either $A$ or $B$, the length of the sampled sequences must be increased so that both are of length $M$. This can be done by appending zeros to the given samples to form the following *extended* sequences:

$$f_e(x) = \begin{cases} f(x) & 0 \leq x \leq A - 1 \\ 0 & A \leq x \leq M - 1 \end{cases}$$

and $$g_e(x) = \begin{cases} g(x) & 0 \leq x \leq B - 1 \\ 0 & B \leq x \leq M - 1 \end{cases}$$

Based on this, we define the discrete convolution of $f_e(x)$ and $g_e(x)$ by the expression $$f_e(x) * g_e(x) = \sum_{m=0}^{M-1} f_e(m) g_e(x - m) \tag{3.3-29}$$

for $x = 0, 1, 2, \ldots, M - 1$. The convolution function is a discrete, periodic array of length $M$, with the values $x = 0, 1, 2, \ldots, M - 1$ describing a full period of $f_e(x) * g_e(x)$.

The mechanics of discrete convolution are basically the same as for continuous convolution. The only differences are that displacements take place in discrete increments corresponding to the separation between samples, and that integration is replaced by a summation. Similarly, Eqs. (3.3-26) and (3.3-27) also hold in the discrete case where, to avoid wraparound error, we use $f_e(x)$ and its transform. The discrete variables $x$ and $u$ assume values in the range $0, 1, 2, \ldots, M - 1$.

Example: The preceding considerations are illustrated graphically in Fig. 3.16 for continuous and discrete convolution. The diagrams for the discrete case show $A$ samples for both $f(x)$ and $g(x)$ in the interval [0, 1], as well as an assumed period of $M = A + B - 1 = 2A - 1$.

Note that the convolution function is periodic and that, since $M = 2A - 1$, the periods are adjacent. Choosing $M > 2A - 1$ would have produced a larger separation between these periods. It is also important to note that a period is completely described by $M$ samples. □

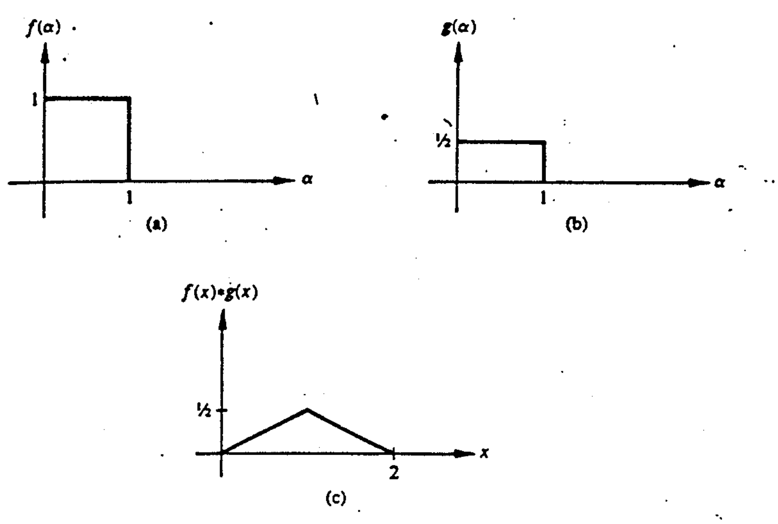

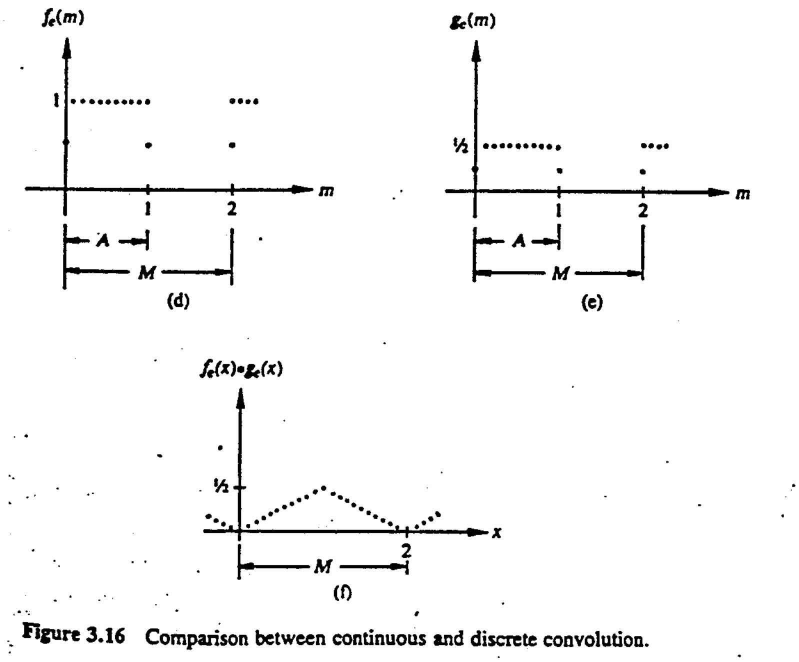

Figure 3.16 Comparison between continuous and discrete convolution.

Two-dimensional convolution is analogous in form to Eq. (3.3-23). Thus for two functions $f(x, y)$ and $g(x, y)$, we have $$f(x, y)*g(x, y) = \iint_{-\infty}^{\infty} f(\alpha, \beta)g(x-\alpha, y-\beta)\, d\alpha\, d\beta. \qquad (3.3\text{-}30)$$

The convolution theorem in two dimensions, then, is given by the relations $$f(x, y)*g(x, y) \Leftrightarrow F(u, v)G(u, v) \qquad (3.3\text{-}31)$$

and $$f(x, y)g(x, y) \Leftrightarrow F(u, v)*G(u, v). \qquad (3.3\text{-}32)$$

Equation (3.3-30) is more difficult to illustrate graphically than Eq. (3.3-23). Figure 3.17 shows the basic folding, displacement, and multiplication operations required for two-dimensional convolution. The result of varying the displacement variables, $x$ and $y$, would be a two-dimensional convolution surface with a shape dependent on the nature of the functions involved in the process.

The two-dimensional, discrete convolution is formulated by letting $f(x, y)$ and $g(x, y)$ be discrete arrays of size $A \times B$ and $C \times D$, respectively. As in the one-dimensional case, these arrays must be assumed periodic with some period $M$ and $N$ in the $x$ and $y$ directions, respectively. Wraparound error in the individual convolution periods is avoided by choosing $$M \geq A + C - 1 \qquad (3.3\text{-}33)$$

and $$N \geq B + D - 1. \qquad (3.3\text{-}34)$$

The periodic sequences are formed by extending $f(x, y)$ and $g(x, y)$ as follows:

$$f_e(x, y) = \begin{cases} f(x, y) & 0 \leq x \leq A-1 \quad \text{and} \quad 0 \leq y \leq B-1 \\ 0 & A \leq x \leq M-1 \quad \text{or} \quad B \leq y \leq N-1 \end{cases}$$

and $$g_e(x, y) = \begin{cases} g(x, y) & 0 \leq x \leq C-1 \quad \text{and} \quad 0 \leq y \leq D-1 \\ 0 & C \leq x \leq M-1 \quad \text{or} \quad D \leq y \leq N-1 \end{cases}$$

The two-dimensional convolution of $f_e(x, y)$ and $g_e(x, y)$ is given by the relation $$f_e(x, y)*g_e(x, y) = \sum_{m=0}^{M-1}\sum_{n=0}^{N-1} f_e(m, n)g_e(x-m, y-n) \qquad (3.3\text{-}35)$$

for $x = 0, 1, 2, \ldots, M-1$ and $y = 0, 1, 2, \ldots, N-1$. The $M \times N$ array given by this equation is one period of the discrete, two-dimensional convolution. If $M$ and $N$ are chosen according to Eqs. (3.3-33) and (3.3-34), this array is guaranteed

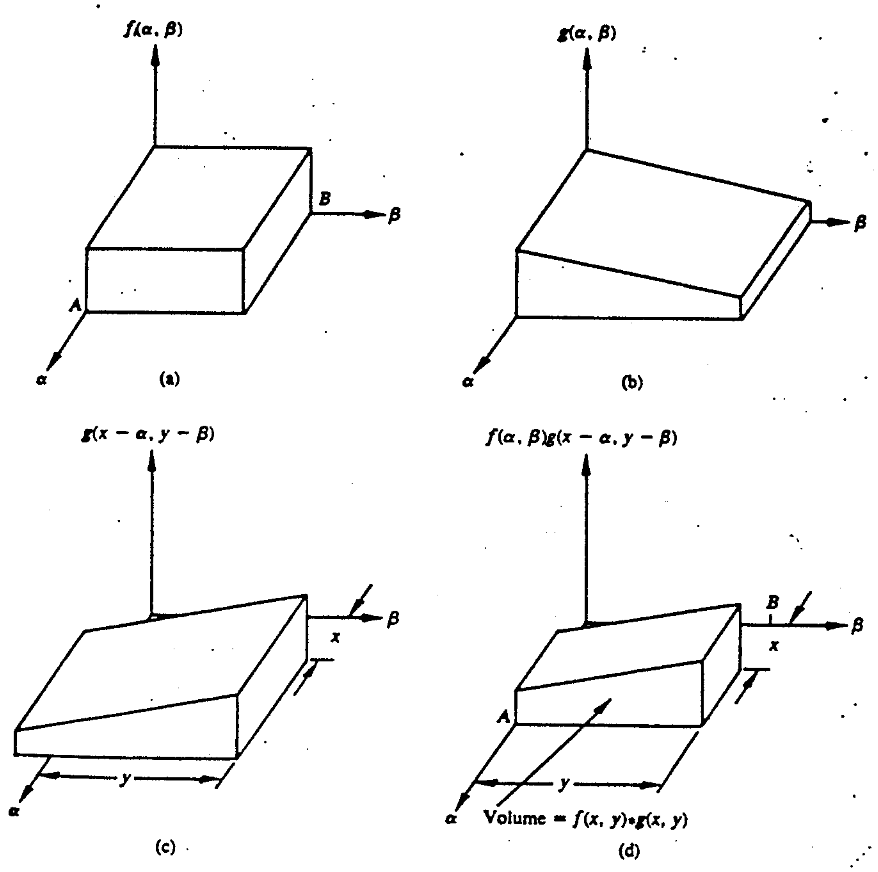

Figure 3.17 Illustration of the folding, displacement, and multiplication steps needed to perform two-dimensional convolution.

to be free of interference from other adjacent periods. As in the one-dimensional case, the continuous convolution theorem given in Eqs. (3.3-31) and (3.3-32) also applies to the discrete case with $u = 0, 1, 2, \ldots, M-1$ and $v = 0, 1, 2, \ldots, N-1$. All computations involve the extended functions $f_e(x, y)$ and $g_e(x, y)$.

The theoretical power of the convolution theorem will become evident in Section 3.3.9 when we discuss the sampling theorem. From a practical point of view, it is often more efficient to compute the discrete convolution in the frequency domain instead of using Eq. (3.3-35) directly. The procedure is to compute the Fourier transforms of $f_e(x, y)$ and $g_e(x, y)$ by using a fast Fourier transform (FFT) algorithm (see Section 3.4). The two transforms are then multiplied and the inverse Fourier transform of the product will yield the convolution function. A comparison by Brigham [1974] shows that, for one-dimensional arrays, the FFT approach is faster if the number of points is greater than 32. Although this figure is dependent on the particular machine and algorithms used, it is well below the number of points in a row or column of a typical image.

Correlation

The correlation† of two continuous functions $f(x)$ and $g(x)$, denoted by $f(x) \circ g(x)$, is defined by the relation $$f(x) \circ g(x) = \int_{-\infty}^{\infty} f^*(\alpha) g(x + \alpha)\, d\alpha, \qquad (3.3\text{-}36)$$

where $^*$ is the complex conjugate. The forms of Eqs. (3.3-36) and (3.3-23) are similar, the only difference being that the function $g(x)$ is not folded about the origin. Thus to perform correlation we simply slide $g(x)$ by $f(x)$ and integrate the product from $-\infty$ to $\infty$ for each value of displacement $x$. The procedure is illustrated in Fig. 3.18, which should be compared with Fig. 3.13.

The discrete equivalent of Eq. (3.3-36) is defined as $$f_e(x)\circ g_e(x) = \sum_{m=0}^{M-1} f_e^*(m)g_e(x+m) \qquad (3.3\text{-}37)$$

for $x = 0, 1, 2, \ldots, M-1$. The comments made earlier regarding $f_e(x)$ and $g_e(x)$, the assumed periodicity of these functions, and the choice of values for $M$, also apply to Eq. (3.3-37).

Similar expressions hold for two dimensions. Thus if $f(x, y)$ and $g(x, y)$ are functions of continuous variables, their correlation is defined as $$f(x, y)\circ g(x, y) = \iint_{-\infty}^{\infty} f^*(\alpha, \beta)g(x+\alpha, y+\beta)\, d\alpha d\beta. \qquad (3.3\text{-}38)$$

For the discrete case we have $$f_e(x, y)\circ g_e(x, y) = \sum_{m=0}^{M-1}\sum_{n=0}^{N-1} f_e^*(m, n)g_e(x+m, y+n) \qquad (3.3\text{-}39)$$

for $x = 0, 1, 2, \ldots, M-1$ and $y = 0, 1, 2, \ldots, N-1$. As in the case of discrete convolution, $f_e(x, y)$ and $g_e(x, y)$ are extended functions, and $M$ and $N$ are chosen according to Eqs. (3.3-33) and (3.3-34) in order to avoid wraparound error in the periods of the correlation function.

† If $f(x)$ and $g(x)$ are the same function, Eq. (3.3-36) is usually called the *autocorrelation* function; if $f(x)$ and $g(x)$ are different, the term *cross-correlation* is normally used.

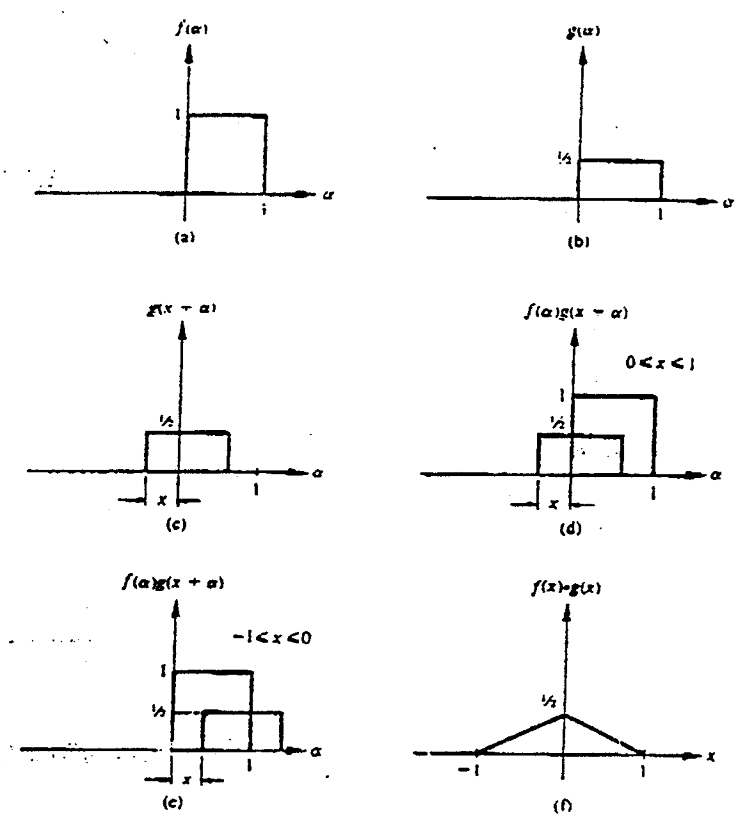

Figure 3.18 Graphical illustration of correlation. The shaded areas indicate regions where the product is not zero.

It can be shown for both the continuous and discrete cases that the following *correlation theorem* holds:

$$f(x, y)\circ g(x, y) \Leftrightarrow F^*(u, v)G(u, v) \qquad (3.3\text{-}40)$$

and $$f^*(x, y)g(x, y) \Leftrightarrow F(u, v)\circ G(u, v). \qquad (3.3\text{-}41)$$

It is understood that, when interpreted for discrete variables, all functions are assumed to be extended and periodic.

One of the principal applications of correlation in image processing is in the area of *template* or *prototype matching*, where the problem is to find the closest match between a given unknown image and a set of images of known origin. One approach to this problem is to compute the correlation between the unknown and each of the known images. The closest match can then be found by selecting the image that yields the correlation function with the largest value. Since the resultant correlations are two-dimensional functions, this involves searching for the largest amplitude of each function. As in the case of discrete convolution, the computation of $f_e(x, y)\circ g_e(x, y)$ is often more efficiently carried out in the frequency domain using an FFT algorithm to obtain the forward and inverse transforms.

When comparing the results of discrete versus continuous convolution or correlation, it should be noted that the way we have defined the discrete cases amounts to evaluation of the continuous forms by rectangular integration. Thus if one wishes to compare discrete and continuous results on an absolute basis, Eqs. (3.3-29) and (3.3-37) should be multiplied by $\Delta x$, and Eqs. (3.3-35) and (3.3-39) by $\Delta x \Delta y$, where $\Delta x$ and $\Delta y$ are the separations between samples, as defined in Section 3.2. In Fig. 3.16, for example, the continuous and discrete convolution functions have the same amplitude because the discrete result was multiplied by $\Delta x$. When one is only computing and evaluating the discrete forms, however, the inclusion of these scale factors is a matter of preference. It is also important to note that all convolution and correlation expressions hold if $f(x)$ and $g(x)$, along with their corresponding transforms, are interchanged. This is also true if the functions are two dimensional.

3.3.9 Sampling

The basic idea of image sampling was introduced in Section 2.3 on an intuitive basis. The Fourier transform and the convolution theorem provide the tools for a deeper analytical study of this problem. In particular, we are interested in looking at the question of how many samples should be taken so that no information is lost in the sampling process. Expressed differently, the problem is one of establishing under what sampling conditions a continuous image can be fully recovered from a set of sampled values. We begin the analysis with the one-dimensional case.

One-dimensional functions

Consider the function shown in Fig. 3.19(a), which is assumed to extend from $-\infty$ to $\infty$, and suppose that the Fourier transform of $f(x)$ vanishes for values of $u$ outside the interval $[-W, W]$. The transform might appear as shown in Fig. 3.19(b).† A function whose transform has this property for any finite value of $W$ is called a *band-limited* function.

† Recall that the Fourier transform is a complex function. For simplicity, in the following graphical illustrations we show only the magnitude of the transforms. The ordinate axis, however, will be labeled with $F(u)$, $G(u)$, etc., to indicate that the concepts involved are valid for the complete transform, and not just its magnitude.

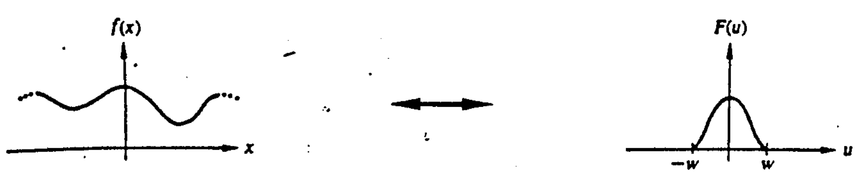

(a) (b)

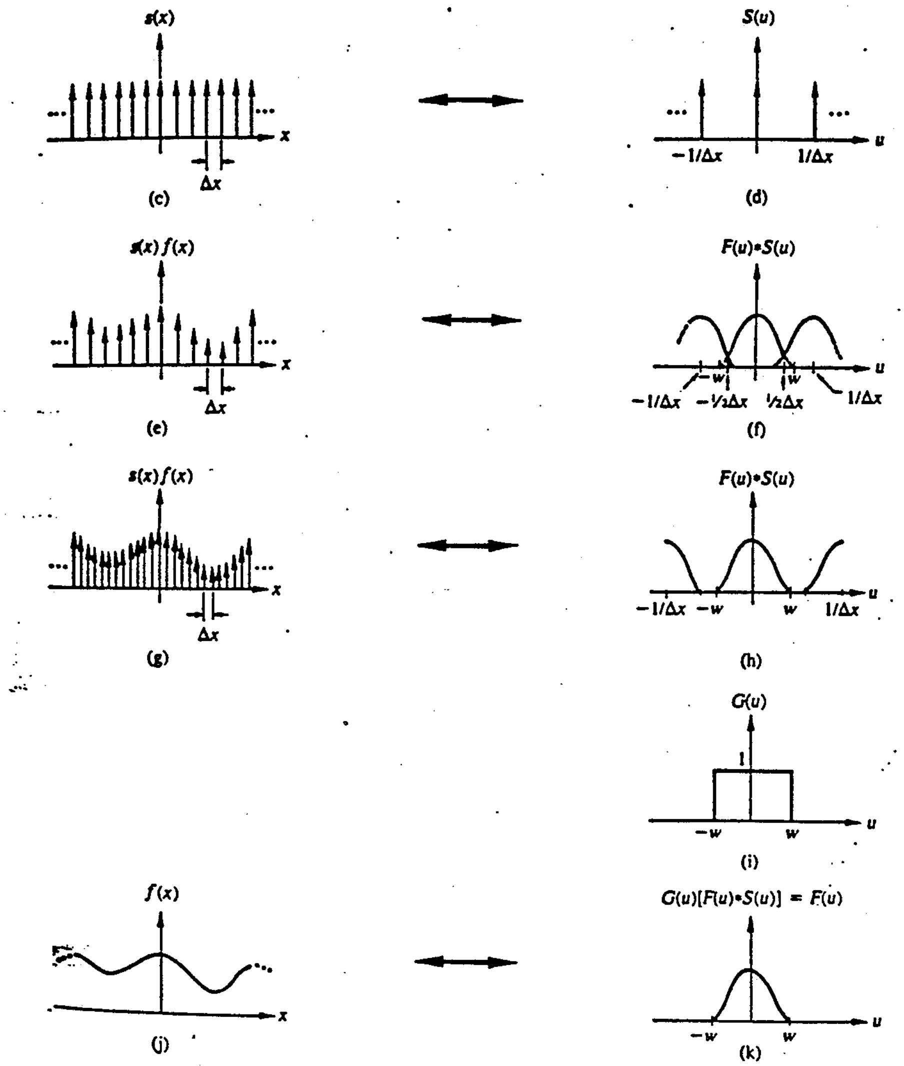

Figure 3.19 Graphical development of sampling concepts.

To obtain a sampled version of $f(x)$, we simply multiply this function by a sampling function $s(x)$, which consists of a train of impulses $\Delta x$ units apart, as shown in Fig. 3.19(c). Since, by the convolution theorem, multiplication in the $x$ domain is equivalent to convolution in the frequency domain, we obtain the Fourier transform shown in Fig. 3.19(f) for the product $s(x)f(x)$. It is noted that the transform is periodic with period $1/\Delta x$, and that the individual repetitions of $F(u)$ can overlap. In the first period, for example, the center of the overlapped region will occur at $u = 1/2\Delta x$ if the quantity $1/2\Delta x$ is less than $W$. Therefore to avoid this problem we select the sampling interval $\Delta x$ so that $1/2\Delta x \geq W$, or $$\Delta x \leq \frac{1}{2W}. \qquad (3.3\text{-}42)$$

The result of decreasing $\Delta x$ is shown in Figs. 3.19(g) and (h). The net effect is to separate the periods so that no overlap occurs. The importance of this operation lies in the fact that if one multiplies the transform of Fig. 3.19(h) by the function $$G(u) = \begin{cases} 1 & -W \leq u \leq W \\ 0 & \text{elsewhere} \end{cases} \qquad (3.3\text{-}43)$$

it becomes possible to isolate $F(u)$ completely, as shown in Fig. 3.19(k). The inverse Fourier transform then yields the original *continuous* function $f(x)$. The fact that a band-limited function can be recovered completely from samples whose spacing satisfies Eq. (3.3-42) is known as the *Whittaker–Shannon sampling theorem*.

It is important to keep in mind that all the frequency-domain information of a band-limited function is contained in the interval $[-W, W]$. If Eq. (3.3-42) is not satisfied, however, the transform in this interval is corrupted by contributions from adjacent periods. This phenomenon, frequently referred to as *aliasing*, precludes complete recovery of an undersampled function.

The foregoing results apply to functions that are of unlimited duration in the $x$ domain. Since this implies an infinite sampling interval, it is of interest to examine the practical case where a function is sampled only over a finite region. This situation is shown graphically in Fig. 3.20. Parts (a) through (f) are the same as in Fig. 3.19, with the exception that the separation between samples is assumed to satisfy the sampling theorem so that no aliasing is present. A finite sampling interval $[0, X]$ can be represented mathematically by multiplying the sampled result shown in Fig. 3.20(e) by the function $$h(x) = \begin{cases} 1 & 0 \leq x \leq X \\ 0 & \text{elsewhere} \end{cases} \qquad (3.3\text{-}44)$$

This function, often called a *window*, and its Fourier transform are shown in Fig. 3.20(g) and (h), respectively. The results of multiplication are illustrated in Fig. 3.20(i) and (j). It is important to note that the final frequency domain result is obtained by convolving the function $S(u)*F(u)$ with $H(u)$, which is the Fourier

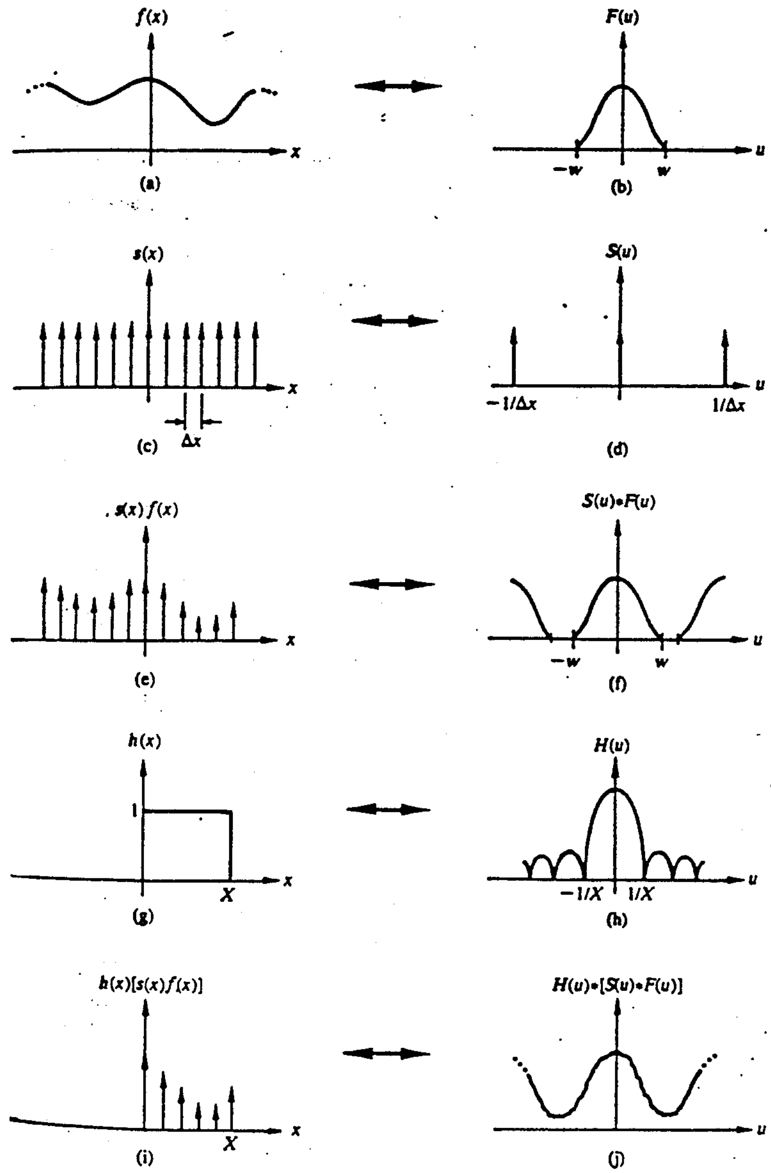

Figure 3.20 Graphical illustration of finite-sampling concepts.

transform of the window function $h(x)$. Since $H(u)$ has frequency components that extend to infinity, the convolution of these functions introduces a distortion in the frequency-domain representation of a function that has been sampled and limited to a finite region by $h(x)$, as shown in Fig. 3.20(j). Thus even if the separation between samples satisfies the sampling theorem, it is generally impossible to recover completely a function that has been sampled only in a finite region of the $x$ domain. This fact can be appreciated by noting that it becomes impossible under these conditions to isolate the original Fourier transform. The only exception to this is when $f(x)$ is band-limited and periodic with a period equal to $X$. In this case it can be shown that the corruptions due to $H(u)$ cancel out, thus allowing complete recovery of $f(x)$ if the sampling theorem is satisfied. It is important to note that the recovered function still extends from $-\infty$ to $\infty$ and is *not* zero outside the range in which $h(x)$ is zero. These considerations lead us to the important conclusion that no function $f(x)$ of finite duration can be band limited. Conversely, a function that is band limited must extend from $-\infty$ to $\infty$ in the $x$ domain. This is an important practical result because it establishes a fundamental limitation in our treatment of digital functions.

Before leaving the discussion of one-dimensional functions, it is of interest to use the above results to give an alternate reason for the periodicity of the discrete Fourier transform. We begin by noting that, thus far, all results in the frequency domain have been of a continuous nature. To obtain a discrete Fourier transform, we simply "sample" the continuous transform with a train of impulses that are $\Delta u$ units apart. The situation is depicted in Fig. 3.21, where use has been made of Figs. 3.20(i) and (j). The notation $f(x)$ and $F(u)$ is used in Fig. 3.21 to facilitate comparison with the discussion in Section 3.2. It should be kept in mind, however, that Figs. 3.21(a) and (b) are assumed to be the result of the sequence of operations shown in Fig. 3.20.

As previously pointed out, sampling can be represented by multiplying the impulse train and the function of interest. In this case, we multiply $F(u)$ by $S(u)$ and obtain the result shown in Fig. 3.21(f). The equivalent operation in the $x$ domain is convolution, which yields the function shown in Fig. 3.21(e). This function is periodic with period $1/\Delta u$. If $N$ samples of $f(x)$ and $F(u)$ are taken and the spacings between samples are selected so that a period in each domain is covered by $N$ uniformly spaced samples, we have that $N\Delta x = X$ in the $x$ domain and $N\Delta u = 1/\Delta x$ in the frequency domain. The latter equation follows from the fact that the Fourier transform of a sampled function is periodic with period $1/\Delta x$, as shown earlier. It follows from this equation that $$\Delta u = \frac{1}{N\Delta x} \qquad (3.3\text{-}45)$$

which agrees with Eq. (3.2-4). Choosing this spacing yields the function in Fig. 3.21(e), which is periodic with period $1/\Delta u$. From Eq. (3.3-45) we have that $1/\Delta u = N\Delta x = X$, which is the overall sampling interval in Fig. 3.21(a).

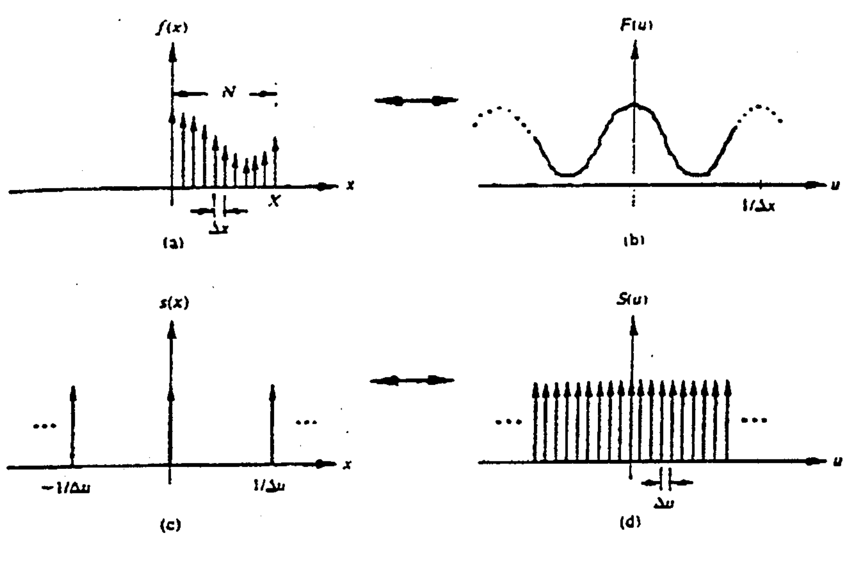

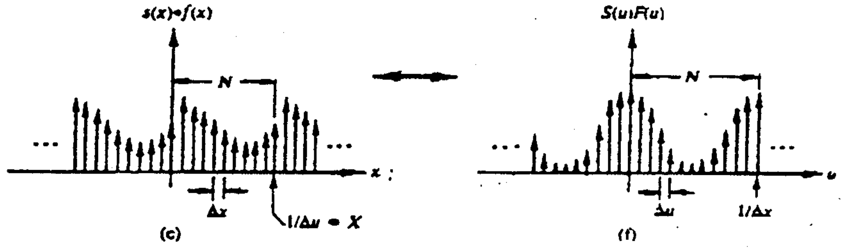

Figure 3.21 Graphical illustration of the discrete Fourier transform.

Two-dimensional functions

The sampling concepts developed above are, after some modifications in notation, directly applicable to two-dimensional functions. The sampling process for these functions can be formulated mathematically by making use of the two-dimensional impulse function $\delta(x, y)$ which we define as follows:

$$\iint_{-\infty}^{\infty} f(x, y)\delta(x - x_0, y - y_0)\, dx\, dy = f(x_0, y_0). \qquad (3.3\text{-}46)$$

The interpretation of Eq. (3.3-46) is analogous to that given in connection with Eqs. (3.3-24) and (3.3-25). A two-dimensional sampling function consisting of a train of impulses separated $\Delta x$ units in the $x$ direction and $\Delta y$ units in the $y$ direction is shown in Fig. 3.22.

Given a function $f(x, y)$, where $x$ and $y$ are continuous, a sampled function is obtained by forming the product $s(x, y)f(x, y)$. The equivalent operation in the frequency domain is convolution of $S(u, v)$ and $F(u, v)$, where $S(u, v)$ is a train of impulses with separation $1/\Delta x$ and $1/\Delta y$ in the $u$ and $v$ directions, respectively. If $f(x, y)$ is band limited (i.e., its Fourier transform vanishes outside some finite region $R$) the result of convolving $S(u, v)$ and $F(u, v)$ might look like the case shown in Fig. 3.23. It is noted that the function shown is periodic in two dimensions.

Let $2W_u$ and $2W_v$ represent the widths in the $u$ and $v$ directions, respectively, of the smallest rectangle that completely encloses the region $R$. Then, from Fig. 3.23, if $1/\Delta x > 2W_u$ and $1/\Delta y > 2W_v$ (i.e., there is no aliasing), one of the periods can be recovered completely if we multiply $S(u, v)*F(u, v)$ by the function $$G(u, v) = \begin{cases} 1 & (u, v) \text{ inside one of the rectangles enclosing } R \\ 0 & \text{elsewhere} \end{cases} \qquad (3.3\text{-}47)$$

The inverse Fourier transform of $G(u, v)[S(u, v)*F(u, v)]$ yields $f(x, y)$.

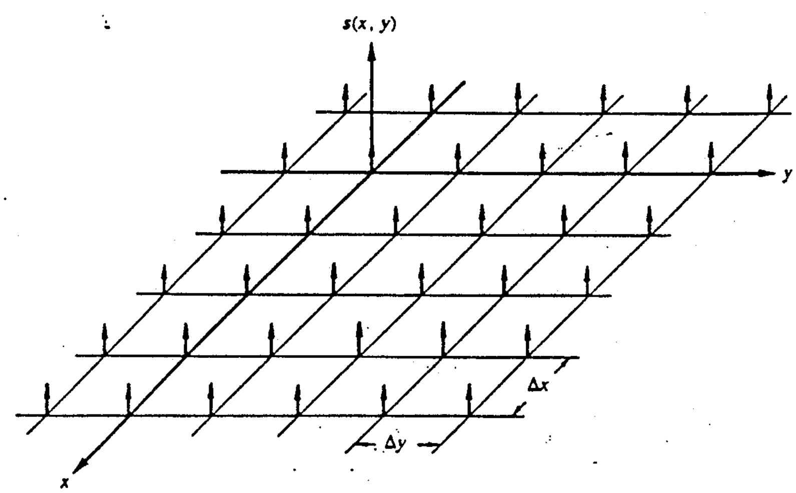

Figure 3.22 A two-dimensional sampling function.

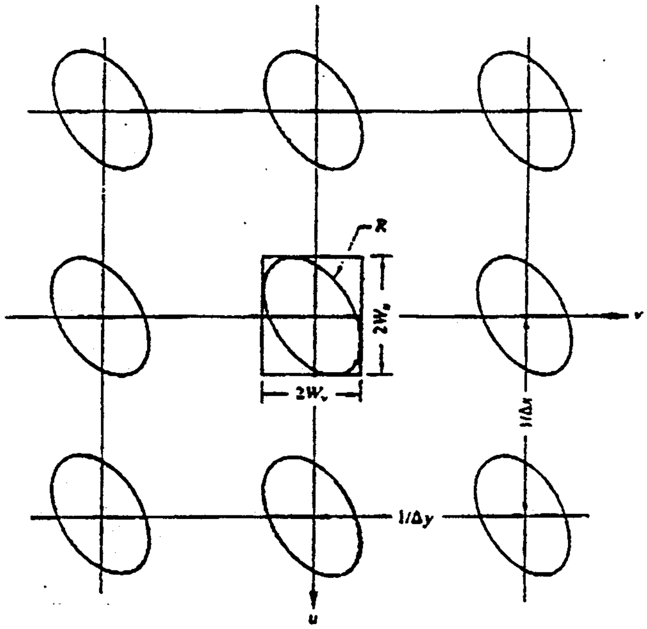

Figure 3.23 Frequency-domain representation of a sampled two-dimensional, band-limited function.

The foregoing considerations lead us to a form of the two-dimensional sampling theorem, which states that a band-limited function $f(x, y)$ can be recovered completely from samples whose separation is given by $$\Delta x \leq \frac{1}{2W_u} \qquad (3.3\text{-}48a)$$

and $$\Delta y \leq \frac{1}{2W_v}. \qquad (3.3\text{-}48b)$$

When $f(x, y)$ is spatially limited by using a two-dimensional window $h(x, y)$ analogous to the function $h(x)$ used in Fig. 3.20, we again have the problem that the transform of the sampled function is distorted by the convolution of $H(u, v)$ and $S(u, v)*F(u, v)$. This distortion, which is due to the spatially limited nature of digital images, precludes complete recovery of $f(x, y)$ from its samples. As in the one-dimensional case, periodic functions are an exception, but images satisfying this condition are rarely found in practice.

An argument similar to the one developed for the one-dimensional case can be carried out to show how periodicity arises in the two-dimensional, discrete Fourier transform. For an $N \times N$ image, this analysis would also yield the following results:

$$\Delta u = \frac{1}{N\Delta x} \qquad (3.3\text{-}49a)$$

and $$\Delta v = \frac{1}{N\Delta y}. \qquad (3.3\text{-}49b)$$

These relationships between the sample separations guarantee that a complete (two-dimensional) period will be covered by $N \times N$ uniformly spaced values in both the spatial and frequency domains.

3.4 THE FAST FOURIER TRANSFORM

The number of complex multiplications and additions required to implement Eq. (3.2-2) is proportional to $N^2$. This can be seen easily by noting that, for each of the $N$ values of $u$, expansion of the summation sign requires $N$ complex multiplications of $f(x)$ by $\exp[-j2\pi ux/N]$ and $(N-1)$ additions of the results. The terms of $\exp[-j2\pi ux/N]$ can be computed once and stored in a table for all subsequent applications. For this reason, the multiplication of $u$ by $x$ in these terms is usually not considered a direct part of the implementation.

In this section it is shown that, by properly decomposing Eq. (3.2-2), the number of multiply and add operations can be made proportional to $N \log_2 N$. The decomposition procedure is called the *fast Fourier transform* (FFT) *algorithm*. The reduction in proportionality from $N^2$ to $N \log_2 N$ multiply/add operations represents a significant saving in computational effort, as shown by the figures in Table 3.1. It is evident from this table that the FFT approach offers a considerable computational advantage over a direct implementation of the Fourier transform, particularly when $N$ is relatively large. For example, a direct implementation of the transform for $N = 8192$ requires on the order of three quarters of an hour on a machine such as an IBM 7094. By contrast, the same job can be done on this machine in about 5 seconds using an FFT algorithm.

Attention is focused below on the development of an FFT algorithm of one variable. As pointed out in Section 3.3.1, a two-dimensional Fourier transform can be readily computed by a series of applications of the one-dimensional transform.

Table 3.1 A Comparison of $N^2$ versus $N \log_2 N$ for Various Values of $N$

| $N$ | $N^2$ (Direct FT) | $N \log_2 N$ (FFT) | Computational Advantage ($N/\log_2 N$) |
|---|---|---|---|
| 2 | 4 | 2 | 2.00 |
| 4 | 16 | 8 | 2.00 |
| 8 | 64 | 24 | 2.67 |
| 16 | 256 | 64 | 4.00 |
| 32 | 1,024 | 160 | 6.40 |
| 64 | 4,096 | 384 | 10.67 |
| 128 | 16,384 | 896 | 18.29 |
| 256 | 65,536 | 2,048 | 32.00 |
| 512 | 262,144 | 4,608 | 56.89 |
| 1024 | 1,048,576 | 10,240 | 102.40 |
| 2048 | 4,194,304 | 22,528 | 186.18 |
| 4096 | 16,777,216 | 49,152 | 341.33 |
| 8192 | 67,108,864 | 106,496 | 630.15 |

3.4.1 FFT Algorithm

The FFT algorithm developed in this section is based on the so-called "successive doubling" method. It will be convenient in the following discussion to express Eq. (3.2-2) in the form $$F(u) = \frac{1}{N}\sum_{x=0}^{N-1} f(x) W_N^{ux}, \tag{3.4-1}$$

where $$W_N = \exp[-j2\pi/N], \tag{3.4-2}$$

and $N$ is assumed to be of the form $$N = 2^n, \tag{3.4-3}$$

where $n$ is a positive integer. Based on this, $N$ can be expressed as $$N = 2M, \tag{3.4-4}$$

where $M$ is also a positive integer. Substitution of Eq. (3.4-4) into Eq. (3.4-1) yields $$\begin{aligned} F(u) &= \frac{1}{2M}\sum_{x=0}^{2M-1} f(x) W_{2M}^{ux} \\ &= \frac{1}{2}\left\{\frac{1}{M}\sum_{x=0}^{M-1} f(2x) W_{2M}^{u(2x)} + \frac{1}{M}\sum_{x=0}^{M-1} f(2x+1) W_{2M}^{u(2x+1)}\right\}. \end{aligned} \tag{3.4-5}$$

Since, from Eq. (3.4-2), $W_{2M}^{2ux} = W_M^{ux}$, Eq. (3.4-5) may be expressed in the form $$F(u) = \frac{1}{2}\left\{\frac{1}{M}\sum_{x=0}^{M-1} f(2x)W_M^{ux} + \frac{1}{M}\sum_{x=0}^{M-1} f(2x+1)W_M^{ux}W_{2M}^{u}\right\}. \quad (3.4\text{-}6)$$

If we define $$F_{even}(u) = \frac{1}{M}\sum_{x=0}^{M-1} f(2x)W_M^{ux} \quad (3.4\text{-}7)$$

for $u = 0, 1, 2, \ldots, M-1$, and $$F_{odd}(u) = \frac{1}{M}\sum_{x=0}^{M-1} f(2x+1)W_M^{ux} \quad (3.4\text{-}8)$$

for $u = 0, 1, 2, \ldots, M-1$, Eq. (3.4-6) then becomes $$F(u) = \frac{1}{2}\{F_{even}(u) + F_{odd}(u)W_{2M}^{u}\}. \quad (3.4\text{-}9)$$

Also, since $W_M^{u+M} = W_M^u$ and $W_{2M}^{u+M} = -W_{2M}^u$, it follows from Eqs. (3.4-7) through (3.4-9) that $$F(u+M) = \frac{1}{2}\{F_{even}(u) - F_{odd}(u)W_{2M}^{u}\}. \quad (3.4\text{-}10)$$

Careful analysis of Eqs. (3.4-7) through (3.4-10) reveals some interesting properties of these expressions. It is noted that an $N$-point transform can be computed by dividing the original expression into two parts, as indicated in Eqs. (3.4-9) and (3.4-10). Computation of the first half of $F(u)$ requires the evaluation of the two ($N/2$)-point transforms given in Eqs. (3.4-7) and (3.4-8). The resulting values of $F_{even}(u)$ and $F_{odd}(u)$ are then substituted into Eq. (3.4-9) to obtain $F(u)$ for $u = 0, 1, 2, \ldots, (N/2-1)$. The other half then follows directly from Eq. (3.4-10) without additional transform evaluations.

In order to examine the computational implications of the above procedure, let $m(n)$ and $a(n)$ represent the number of complex multiplications and additions, respectively, required to implement this method. As before, the number of samples is equal to $2^n$, where $n$ is a positive integer. Suppose first that $n = 1$. A two-point transform requires the evaluation of $F(0)$; then $F(1)$ follows from Eq. (3.4-10). To obtain $F(0)$, we must first compute $F_{even}(0)$ and $F_{odd}(0)$. In this case $M = 1$ and Eqs. (3.4-7) and (3.4-8) are one-point transforms. Since the Fourier transform of a single point is the sample itself, however, no multiplications or additions are required to obtain $F_{even}(0)$ and $F_{odd}(0)$. One multiplication of $F_{odd}(0)$ by $W_2^0$ and one addition yield $F(0)$ from Eq. (3.4-9). $F(1)$ then follows from Eq. (3.4-10) with one more addition (we consider subtraction to be the same as addition). Since $F_{odd}(0)W_2^0$ was already computed, we have that the total number of operations required for a two-point transform consists of $m(1) = 1$ multiplication and $a(1) = 2$ additions.

The next allowed value for $n$ is 2. According to the above development, a four-point transform can be divided into two parts. The first half of $F(u)$ requires evaluation of two, two-point transforms, as given in Eqs. (3.4-7) and (3.4-8) for $M = 2$. Since a two-point transform requires $m(1)$ multiplications and $a(1)$ additions, it is evident that evaluation of these two equations requires a total of $2m(1)$ multiplications and $2a(1)$ additions. Two further multiplications and additions are necessary to obtain $F(0)$ and $F(1)$ from Eq. (3.4-9). Since $F_{odd}(u)W_{2M}^u$ was already computed for $u = \{0, 1\}$, we find that two more additions give $F(2)$ and $F(3)$. The total is then $m(2) = 2m(1) + 2$ and $a(2) = 2a(1) + 4$.

When $n$ is equal to 3, we consider two four-point transforms in the evaluation of $F_{even}(u)$ and $F_{odd}(u)$. These require $2m(2)$ multiplications and $2a(2)$ additions. Four more multiplications and eight more additions yield the complete transform. The total is then $m(3) = 2m(2) + 4$ and $a(3) = 2a(2) + 8$.

By continuing this argument one would find that, for any positive integer value of $n$, the number of multiplications and additions required to implement the FFT is given by the recursive expressions $$m(n) = 2m(n-1) + 2^{n-1} \quad n \geq 1 \quad (3.4\text{-}11)$$

and $$a(n) = 2a(n-1) + 2^n \quad n \geq 1, \quad (3.4\text{-}12)$$

where $m(0) = 0$ and $a(0) = 0$, since the transform of a single point does not require any additions or multiplications.

Implementation of Eqs. (3.4-7) through (3.4-10) constitutes the successive-doubling FFT algorithm. This name arises from the fact that a two-point transform is computed from two one-point transforms, a four-point transform from two two-point transforms, and so on, for any $N$ that is equal to an integer power of 2.

3.4.2 Number of Operations

In this section it is shown by induction that the number of complex multiplications and additions required to implement the above FFT algorithm is given by $$\begin{aligned} m(n) &= \frac{1}{2} 2^n \log_2 2^n \\ &= \frac{1}{2} N \log_2 N \\ &= \frac{1}{2} Nn \quad n \geq 1 \end{aligned} \tag{3.4-13}$$

and $$\begin{aligned} a(n) &= 2^n \log_2 2^n \\ &= N \log_2 N \\ &= Nn \quad n \geq 1, \end{aligned} \tag{3.4-14}$$

respectively.

First, it is necessary to prove that Eqs. (3.4-13) and (3.4-14) hold for $n = 1$. It was already shown that $$m(1) = \tfrac{1}{2}(2)(1) = 1$$

and $$a(1) = (2)(1) = 2.$$

Next, it is assumed that the expressions hold for $n$. It is then required to prove that they are also true for $n + 1$.

From Eq. (3.4-11) it follows that $$m(n + 1) = 2m(n) + 2^n.$$

Substituting Eq. (3.4-13), which is assumed to be valid for $n$, yields $$\begin{aligned} m(n + 1) &= 2(\tfrac{1}{2}Nn) + 2^n \\ &= 2(\tfrac{1}{2}2^n n) + 2^n \\ &= 2^n(n + 1) \\ &= \tfrac{1}{2}2^{n+1}(n + 1). \end{aligned}$$

Equation (3.4-13) is therefore valid for all positive integer values of $n$.

From Eq. (3.4-12), we have $$a(n + 1) = 2a(n) + 2^{n+1}.$$

Substitution of Eq. (3.4-14) for $a(n)$ yields $$\begin{aligned} a(n + 1) &= 2Nn + 2^{n+1} \\ &= 2(2^n n) + 2^{n+1} \\ &= 2^{n+1}(n + 1). \end{aligned}$$

This completes the proof.

3.4.3 The Inverse FFT

Thus far, little has been said concerning the inverse Fourier transform. It turns out that any algorithm for implementing the discrete forward transform can also be used (with minor modifications in the input) to compute the inverse. To see this, let us consider Eqs. (3.2-2) and (3.2-3), which are repeated below:

$$F(u) = \frac{1}{N} \sum_{x=0}^{N-1} f(x) \exp[-j2\pi ux/N] \tag{3.4-15}$$

and $$f(x) = \sum_{u=0}^{N-1} F(u) \exp[j2\pi ux/N]. \tag{3.4-16}$$

Taking the complex conjugate of Eq. (3.4-16) and dividing both sides by $N$ yields $$\frac{1}{N} f^*(x) = \frac{1}{N} \sum_{u=0}^{N-1} F^*(u) \exp[-j2\pi ux/N]. \tag{3.4-17}$$

By comparing this result with Eq. (3.4-15) we see that the right side of Eq. (3.4-17) is in the form of the forward Fourier transform. Thus if we input $F^*(u)$ into an algorithm designed to compute the forward transform, the result will be the quantity $f^*(x)/N$. Taking the complex conjugate and multiplying by $N$ yields the desired inverse $f(x)$.

For two-dimensional square arrays we take the complex conjugate of Eq. (3.2-10), that is, $$f^*(x, y) = \frac{1}{N}\sum_{u=0}^{N-1}\sum_{v=0}^{N-1} F^*(u, v)\exp[-j2\pi(ux + vy)/N]. \qquad (3.4\text{-}18)$$

which we see is in the form of the two-dimensional forward transform given in Eq. (3.2-9). It therefore follows that if we input $F^*(u, v)$ into an algorithm designed to compute the forward transform, the result will be $f^*(x, y)$. By taking the complex conjugate of this result we obtain $f(x, y)$. In the case where $f(x)$ or $f(x, y)$ is real, the complex conjugate operation is unnecessary since $f(x) = f^*(x)$ and $f(x, y) = f^*(x, y)$ for real functions.

The fact that the two-dimensional transform is usually computed by successive passes of the one-dimensional transform is a frequent source of confusion when using the above technique to obtain the inverse. The reader should keep in mind the procedure outlined in Section 3.3.1 and avoid being misled by Eq. (3.4-17). In other words, when using a one-dimensional algorithm to compute the two-dimensional inverse, the method is not to compute the complex conjugate after each row or column is processed. Instead, the function $F^*(u, v)$ is treated as if it were $f(x, y)$ in the forward, two-dimensional transform procedure summarized in Fig. 3.9. The complex conjugate of the result (if necessary) will yield the proper inverse, $f(x, y)$.

3.4.4 Implementation

A computer implementation of the FFT algorithm developed in Section 3.4.1 is straightforward. The principal point to keep in mind is that the input data must be arranged in the order required for successive applications of Eqs. (3.4-7) and (3.4-8). The ordering procedure can be illustrated by a simple example. Suppose that we wish to use the successive doubling algorithm to compute the FFT of an eight-point function $\{f(0), f(1), \ldots, f(7)\}$. Equation (3.4-7) uses the samples with even arguments, $\{f(0), f(2), f(4), f(6)\}$, and Eq. (3.4-8) uses the samples with odd arguments, $\{f(1), f(3), f(5), f(7)\}$. However, each four-point transform is computed as two two-point transforms. This also requires the use of Eqs. (3.4-7) and (3.4-8). Thus to compute the FFT of the first set above, we must divide it into its even part $\{f(0), f(4)\}$ and odd part $\{f(2), f(6)\}$. Similarly, the second set is subdivided into $\{f(1), f(5)\}$ for Eq. (3.4-7) and $\{f(3), f(7)\}$ for Eq. (3.4-8). No further rearrangement is required since each two-element set is considered as having one even and one odd element. Combining these results, we have that the input array must be expressed in the form $\{f(0), f(4), f(2), f(6), f(1), f(5), f(3), f(7)\}$. The successive-doubling algorithm operates on this array in the manner shown in Fig. 3.24. At the first level of computation are four two-point transforms involving $\{f(0), f(4)\}$, $\{f(2), f(6)\}$, $\{f(1), f(5)\}$, and $\{f(3), f(7)\}$. The next level uses these results to form two four-point transforms, and the last level uses these two results to produce the desired transform.

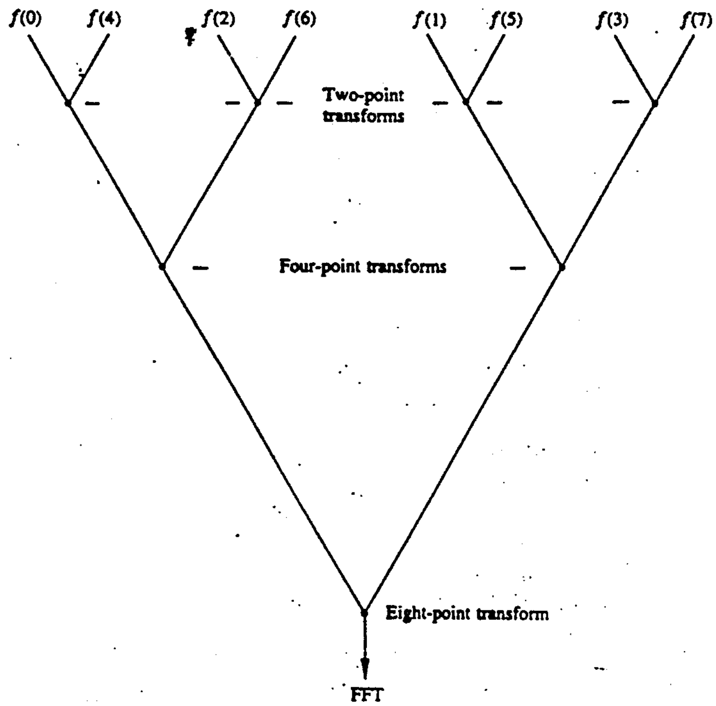

Figure 3.24 Ordered input array and its use in the successive-doubling method.

Fortunately, the general procedure for reordering an input array follows a simple *bit-reversal* rule. If we let $x$ represent any valid argument value in $f(x)$, then the corresponding argument in the reordered array is given by expressing $x$ in binary and reversing the bits. For example, if $N = 2^3$, the seventh element in the original array, $f(6)$, becomes the fourth element in the reordered array since $6 = 110_2$ becomes $011_2 = 3$ when the bits are reversed. It is noted that this is a left-to-right reversal of the binary number and should not be confused with the binary complement. The procedure is summarized in Table 3.2 for $N = 8$. If the reordered array is used in computing the FFT, the answer will be the elements of the Fourier transform in the correct order. Conversely, it can be shown that if the array is used in its natural order, the answer will be bit-reversed. Identical comments hold for computing the inverse transform.

A FORTRAN subroutine for computing the FFT by the successive-doubling method is shown in Fig. 3.25. The parameters in the subroutine argument are as follows. On input, $F$ is an array whose transform is desired and $LN$ is equal to $n$. On output, the array $F$ contains the Fourier transform. It is noted that $F$ is a complex array so that if the input is a real function the imaginary part of $F$ must be set to zero before calling the subroutine.

The first part of the program, including the "DO 3" loop, performs reordering of the input data. The second part, including the "DO 5" loop, does the successive-doubling calculations. The "DO 6" loop divides the results by $N$. It has been estimated that, for $N = 1024$, this simple program is only about 12% less efficient than a more optimally written FORTRAN program that uses a table for storing values of $W_{2M}^{u}$.

Equations (3.3-3) through (3.3-6), along with Figs. 3.9 and 3.25, provide the necessary information for implementing the two-dimensional, forward FFT. The same concepts are applicable to the inverse transform by using the complex conjugate

Table 3.2 Example of Bit Reversal and Reordering of Array for Input into FFT Algorithm

| Original Argument | Original Array | Bit-reversed Argument | Reordered Array |
|---|---|---|---|
| 0 0 0 | $f(0)$ | 0 0 0 | $f(0)$ |
| 0 0 1 | $f(1)$ | 1 0 0 | $f(4)$ |
| 0 1 0 | $f(2)$ | 0 1 0 | $f(2)$ |
| 0 1 1 | $f(3)$ | 1 1 0 | $f(6)$ |
| 1 0 0 | $f(4)$ | 0 0 1 | $f(1)$ |
| 1 0 1 | $f(5)$ | 1 0 1 | $f(5)$ |
| 1 1 0 | $f(6)$ | 0 1 1 | $f(3)$ |
| 1 1 1 | $f(7)$ | 1 1 1 | $f(7)$ |

```
      SUBROUTINE FFT(F,LN)
      COMPLEX F(1024),U,W,T,CMPLX
      PI=3.141593
      N=2**LN
      NV2=N/2
      NM1=N-1
      J=1
      DO 3 I=1,NM1
         IF(I.GE.J) GO TO 1
         T=F(J)
         F(J)=F(I)
         F(I)=T
1        K=NV2
2        IF(K.GE.J) GO TO 3
         J=J-K
         K=K/2
         GO TO 2
3        J=J+K
      DO 5 L=1,LN
         LE=2**L
         LE1=LE/2
         U=(1.0,0.0)
         W=CMPLX(COS(PI/LE1),-SIN(PI/LE1))
         DO 5 J=1,LE1
            DO 4 I=J,N,LE
               IP=I+LE1
               T=F(IP)*U
               F(IP)=F(I)-T
4              F(I)=F(I)+T
5           U=U*W
      DO 6 I=1,N
6        F(I)=F(I)/FLOAT(N)
      RETURN
      END
```

Figure 3.25 A FORTRAN implementation of the successive-doubling FFT algorithm. (Adapted from Cooley *et al.* [1969].)

of the Fourier transform as the input to the FFT subroutine, as indicated in Section 3.4.3.

It should be noted before leaving this section that it is possible to formulate the FFT using other integer bases greater than two. In fact, a base-three formulation requires slightly fewer operations than any other base (Cooley, Lewis, and Welch [1969]), but its disadvantage in terms of programming makes it an unattractive choice. A base-four is equal to a base-two implementation in terms of required operations, and all other bases are less efficient, requiring a progressively larger number of operations. Fast Fourier transform algorithms are usually formulated in a base-two format because it is easier to implement in assembly language.

3.5 OTHER SEPARABLE IMAGE TRANSFORMS

The one-dimensional, discrete Fourier transform is one of a class of important transforms that can be expressed in terms of the general relation $$T(u) = \sum_{x=0}^{N-1} f(x)g(x, u), \tag{3.5-1}$$

where $T(u)$ is the transform of $f(x)$, $g(x, u)$ is the *forward transformation kernel*, and $u$ assumes values in the range $0, 1, \ldots, N-1$. Similarly, the inverse transform is given by the relation $$f(x) = \sum_{u=0}^{N-1} T(u)h(x, u), \tag{3.5-2}$$

where $h(x, u)$ is the *inverse transformation kernel* and $x$ assumes values in the range $0, 1, \ldots, N-1$. The nature of a transform is determined by the properties of its transformation kernel.

For two-dimensional square arrays the forward and inverse transforms are given by the equations $$T(u, v) = \sum_{x=0}^{N-1} \sum_{y=0}^{N-1} f(x, y)g(x, y, u, v) \tag{3.5-3}$$

and $$f(x, y) = \sum_{u=0}^{N-1} \sum_{v=0}^{N-1} T(u, v)h(x, y, u, v), \tag{3.5-4}$$

where, as above, $g(x, y, u, v)$ and $h(x, y, u, v)$ are called the *forward* and *inverse transformation kernels*, respectively.

The forward kernel is said to be *separable* if $$g(x, y, u, v) = g_1(x, u)g_2(y, v). \tag{3.5-5}$$

In addition, the kernel is *symmetric* if $g_1$ is functionally equal to $g_2$. In this case, Eq. (3.5-5) can be expressed in the form $$g(x, y, u, v) = g_1(x, u)g_1(y, v). \tag{3.5-6}$$

Identical comments hold for the inverse kernel if $g(x, y, u, v)$ is replaced by $h(x, y, u, v)$ in Eqs. (3.5-5) and (3.5-6).

The two-dimensional Fourier transform is a special case of Eq. (3.5-3). It has the kernel $$g(x, y, u, v) = \frac{1}{N} \exp[-j2\pi(ux + vy)/N],$$

which is separable and symmetric since $$\begin{aligned} g(x, y, u, v) &= g_1(x, u)g_1(y, v) \\ &= \frac{1}{\sqrt{N}} \exp[-j2\pi ux/N] \frac{1}{\sqrt{N}} \exp[-j2\pi vy/N]. \end{aligned} \tag{3.5-7}$$

It is easily shown that the inverse Fourier kernel is also separable and symmetric.

A transform with a separable kernel can be computed in two steps, each requiring a one-dimensional transform. First, the one-dimensional transform is taken along each row of $f(x, y)$, yielding $$T(x, v) = \sum_{y=0}^{N-1} f(x, y)g_2(y, v) \tag{3.5-8}$$

for $x, v = 0, 1, 2, \ldots, N-1$. Next, the one-dimensional transform is taken along each column of $T(x, v)$; this results in the expression $$T(u, v) = \sum_{x=0}^{N-1} T(x, v)g_1(x, u) \tag{3.5-9}$$

for $u, v = 0, 1, 2, \ldots, N-1$. It is noted that this procedure agrees with the method given in Section 3.3.1 for the Fourier transform. The same final results are obtained if the transform is taken first along each column of $f(x, y)$ to obtain $T(y, u)$ and then along each row of the latter function to obtain $T(u, v)$. Similar comments hold for the inverse transform if $h(x, y, u, v)$ is separable.

If the kernel $g(x, y, u, v)$ is separable and symmetric, Eq. (3.5-3) can also be expressed in the following matrix form:

$$\mathbf{T} = \mathbf{AFA}. \qquad (3.5\text{-}10)$$

where $\mathbf{F}$ is the $N \times N$ image matrix, $\mathbf{A}$ is an $N \times N$ symmetric transformation matrix with elements $a_{ij} = g_1(i, j)$, and $\mathbf{T}$ is the resulting $N \times N$ transform for values of $u$ and $v$ in the range $0, 1, 2, \ldots, N-1$.

To obtain the inverse transform we premultiply and postmultiply Eq. (3.5-10) by an inverse transformation matrix $\mathbf{B}$. This operation yields the expression $$\mathbf{BTB} = \mathbf{BAFAB}. \qquad (3.5\text{-}11)$$

If $\mathbf{B} = \mathbf{A}^{-1}$, it then follows that $$\mathbf{F} = \mathbf{BTB}. \qquad (3.5\text{-}12)$$

which indicates that the digital image $\mathbf{F}$ can be recovered completely from its transform. If $\mathbf{B}$ is not equal to $\mathbf{A}^{-1}$, then use of Eq. (3.5-11) yields an approximation to $\mathbf{F}$, given by the relation $$\hat{\mathbf{F}} = \mathbf{BAFAB}. \qquad (3.5\text{-}13)$$

A number of transforms, including the Fourier, Walsh, Hadamard, and Discrete Cosine transforms, can be expressed in the forms of Eqs. (3.5-10) and (3.5-12). An important property of the resulting transformation matrices is that they can be decomposed into products of matrices with fewer nonzero entries than the original matrix. This result, first formulated by Good [1958] for the Fourier transform, reduces redundancy and, consequently, the number of operations required to implement a two-dimensional transform. The degree of reduction is equivalent to that achieved by an FFT algorithm, being on the order of $N \log_2 N$ multiply/add operations for each row or column of an $N \times N$ image. Although attention is focused in this book on computational procedures based on successive applications of one-dimensional algorithms to obtain the forward and inverse transforms of an image, it should be kept in mind that equivalent computational results can be obtained via a matrix formulation of the problem. The interested reader should consult the book by Andrews [1970] for additional details on this topic.

3.5.1 Walsh Transform

When $N = 2^n$, the discrete Walsh transform of a function $f(x)$, denoted by $W(u)$, is obtained by substituting the kernel $$g(x, u) = \frac{1}{N} \prod_{i=0}^{n-1} (-1)^{b_i(x) b_{n-1-i}(u)} \qquad (3.5\text{-}14)$$

into Eq. (3.5-1). In other words, $$W(u) = \frac{1}{N} \sum_{x=0}^{N-1} f(x) \prod_{i=0}^{n-1} (-1)^{b_i(x) b_{n-1-i}(u)}, \qquad (3.5\text{-}15)$$

where $b_k(z)$ is the $k$th bit in the binary representation of $z$. For example, if $n = 3$ and $z = 6$ (110 in binary), we have that $b_0(z) = 0$, $b_1(z) = 1$, and $b_2(z) = 1$.

The values of $g(x, u)$, excluding the $1/N$ constant term, are listed in Table 3.3 for $N = 8$. The array formed by the Walsh transformation kernel is a symmetric matrix whose rows and columns are orthogonal. These properties, which hold in general, lead to an inverse kernel that is identical to the forward kernel, except for a constant multiplicative factor of $1/N$; that is, $$h(x, u) = \prod_{i=0}^{n-1} (-1)^{b_i(x) b_{n-1-i}(u)}. \qquad (3.5\text{-}16)$$

Table 3.3 Values of the Walsh Transformation Kernel for $N = 8$

| u \ x | 0 | 1 | 2 | 3 | 4 | 5 | 6 | 7 |
|---|---|---|---|---|---|---|---|---|
| 0 | − | + | − | + | + | + | − | − |
| 1 | − | + | + | + | − | − | − | − |
| 2 | − | + | − | − | + | + | − | − |
| 3 | − | + | − | − | − | − | − | − |
| 4 | − | − | − | − | + | − | − | − |
| 5 | − | − | + | − | − | + | − | + |
| 6 | − | − | − | + | + | − | − | + |
| 7 | − | − | − | + | − | + | − | − |

Thus the inverse Walsh transform is given by $$f(x) = \sum_{u=0}^{N-1} W(u) \prod_{i=0}^{n-1} (-1)^{b_i(x) b_{n-1-i}(u)} \tag{3.5-17}$$

It is noted that, unlike the Fourier transform, which is based on trigonometric terms, the Walsh transform consists of a series expansion of basis functions whose values are +1 or −1.

The validity of Eq. (3.5-17) is easily established by substituting Eq. (3.5-15) for $W(u)$ and making use of the orthogonality condition mentioned above. It is also of interest to note from Eqs. (3.5-15) and (3.5-17) that the forward and inverse Walsh transforms differ only by the $1/N$ term. Thus any algorithm for computing the forward transform can be used directly to obtain the inverse transform simply by multiplying the result of the algorithm by $N$.

The two-dimensional forward and inverse Walsh kernels are given by the relations $$g(x, y, u, v) = \frac{1}{N} \prod_{i=0}^{n-1} (-1)^{[b_i(x) b_{n-1-i}(u) + b_i(y) b_{n-1-i}(v)]} \tag{3.5-18}$$

and $$h(x, y, u, v) = \frac{1}{N} \prod_{i=0}^{n-1} (-1)^{[b_i(x) b_{n-1-i}(u) + b_i(y) b_{n-1-i}(v)]}. \tag{3.5-19}$$

Although it is just as valid to group both $1/N$ terms in front of $g(x, y, u, v)$ or $h(x, y, u, v)$, the forms given in Eqs. (3.5-18) and (3.5-19) are preferable in image processing applications, where there is equal interest in taking the forward and inverse transforms. Since the formulation given in these equations yields identical kernels, it follows from Eqs. (3.5-3) and (3.5-4) that the forward and inverse Walsh transforms are also equal in form; that is, $$W(u, v) = \frac{1}{N} \sum_{x=0}^{N-1} \sum_{y=0}^{N-1} f(x, y) \prod_{i=0}^{n-1} (-1)^{[b_i(x) b_{n-1-i}(u) + b_i(y) b_{n-1-i}(v)]} \tag{3.5-20}$$

and $$f(x, y) = \frac{1}{N} \sum_{u=0}^{N-1} \sum_{v=0}^{N-1} W(u, v) \prod_{i=0}^{n-1} (-1)^{[b_i(x) b_{n-1-i}(u) + b_i(y) b_{n-1-i}(v)]}. \tag{3.5-21}$$

Thus any algorithm used to compute the two-dimensional forward Walsh transform can also be used without modification to compute the inverse transform.

The Walsh transform kernels are separable and symmetric since $$\begin{aligned} g(x, y, u, v) &= g_1(x, u)\, g_1(y, v) \\ &= h_1(x, u)\, h_1(y, v) \\ &= \left[\frac{1}{\sqrt{N}} \prod_{i=0}^{n-1} (-1)^{b_i(x) b_{n-1-i}(u)}\right] \left[\frac{1}{\sqrt{N}} \prod_{i=0}^{n-1} (-1)^{b_i(y) b_{n-1-i}(v)}\right]. \end{aligned} \tag{3.5-22}$$

It therefore follows that $W(u, v)$ and its inverse can be computed by successive applications of the one-dimensional Walsh transform given in Eq. (3.5-15). The procedure followed in the computation is the same as the one given in Section 3.3.1 and Fig. 3.9 for the Fourier transform.

The Walsh transform can be computed by a fast algorithm identical in form to the successive-doubling method given in Section 3.4.1 for the FFT. The only difference is that all exponential terms $W_N$ are set equal to one in the case of the fast Walsh transform (FWT).† Equations (3.4-9) and (3.4-10), which are the basic relations leading to the FFT, then become $$W(u) = \tfrac{1}{2}\{W_{even}(u) + W_{odd}(u)\} \tag{3.5-23}$$

and $$W(u + M) = \tfrac{1}{2}\{W_{even}(u) - W_{odd}(u)\}, \tag{3.5-24}$$

where $M = N/2$, $u = 0, 1, \ldots, M - 1$, and $W(u)$ denotes the one-dimensional Walsh transform. Rather than giving a general proof of this result, let us illustrate the use of Eq. (3.5-15) and the validity of Eqs. (3.5-23) and (3.5-24) by means of a simple example. Further details on this subject may be found in Shanks [1969].

Example: If $N = 4$, use of Eq. (3.5-15) results in the following sequence of steps:

$$W(0) = \frac{1}{4}\sum_{x=0}^{3}\left[f(x)\prod_{i=0}^{1}(-1)^{b_i(x)b_{1-i}(0)}\right]$$
$$= \frac{1}{4}[f(0) + f(1) + f(2) + f(3)]$$

* The use of $W$ in this section to denote the Walsh transform should not be confused with our use of the same symbol in Section 3.4.1 to denote exponential terms.

$$W(1) = \frac{1}{4}\sum_{x=0}^{3} f(x)\prod_{i=0}^{1}(-1)^{b_i(x)b_{1-i}(1)}\Big]$$
$$= \frac{1}{4}[f(0) + f(1) - f(2) - f(3)]$$
$$W(2) = \frac{1}{4}\sum_{x=0}^{3}\left[f(x)\prod_{i=0}^{1}(-1)^{b_i(x)b_{1-i}(2)}\right]$$
$$= \frac{1}{4}[f(0) - f(1) + f(2) - f(3)]$$
$$W(3) = \frac{1}{4}\sum_{x=0}^{3}\left[f(x)\prod_{i=0}^{1}(-1)^{b_i(x)b_{1-i}(3)}\right]$$
$$= \frac{1}{4}[f(0) - f(1) - f(2) + f(3)]$$

In order to show the validity of Eqs. (3.5-23) and (3.5-24) we subdivide these results into two groups; that is, $$W_{even}(0) = \tfrac{1}{2}[f(0) + f(2)] \quad W_{odd}(0) = \tfrac{1}{2}[f(1) + f(3)]$$
$$W_{even}(1) = \tfrac{1}{2}[f(0) - f(2)] \quad W_{odd}(1) = \tfrac{1}{2}[f(1) - f(3)]$$

From Eq. (3.5-23), we have $$W(0) = \tfrac{1}{2}[W_{even}(0) + W_{odd}(0)]$$
$$= \tfrac{1}{4}[f(0) + f(1) + f(2) + f(3)]$$

and $$W(1) = \tfrac{1}{2}[W_{even}(1) + W_{odd}(1)]$$
$$= \tfrac{1}{4}[f(0) + f(1) - f(2) - f(3)].$$

The next two terms are computed from these results using Eq. (3.5-24):

$$W(2) = \tfrac{1}{2}[W_{even}(0) - W_{odd}(0)]$$
$$= \tfrac{1}{4}[f(0) - f(1) + f(2) - f(3)]$$

and $$W(3) = \tfrac{1}{2}[W_{even}(1) - W_{odd}(1)]$$
$$= \tfrac{1}{4}[f(0) - f(1) - f(2) + f(3)].$$

Thus computation of $W(u)$ by Eq. (3.5-15) or by Eqs. (3.5-23) and (3.5-24) yields identical results.

As indicated above, an algorithm used to compute the FFT by the successive-doubling method can be easily modified for computing a fast Walsh transform simply by setting all trigonometric terms equal to 1. Figure 3.26 illustrates the required modifications for the FFT program given in Fig. 3.25. It is noted that the Walsh transform is real, thus requiring less computer storage for a given problem than the Fourier transform, which is generally complex.

3.5.2 Hadamard Transform

One of several known formulations for the one-dimensional, forward Hadamard kernel is given by the relation $$g(x, u) = \frac{1}{N}(-1)^{\sum_{i=0}^{n-1} b_i(x)b_i(u)} \qquad (3.5\text{-}25)$$

where the summation in the exponent is performed in modulo 2 arithmetic and, as in Eq. (3.5-14), $b_k(z)$ is the $k$th bit in the binary representation of $z$. Substitution

```
      SUBROUTINE FWT(F,LN)
      REAL F(1024),T
      N=2**LN
      NV2=N/2
      NM1=N-1
      J=1
      DO 3 I=1,NM1
         IF(I.GE.J) GO TO 1
         T=F(J)
         F(J)=F(I)
         F(I)=T
1        K=NV2
2        IF(K.GE.J) GO TO 3
         J=J-K
         K=K/2
         GO TO 2
3        J=J+K
      DO 5 L=1,LN
         LE=2**L
         LE1=LE/2
         DO 5 J=1,LE1
            DO 4 I=J,N,LE
               IP=I+LE1
               T=F(IP)
               F(IP)=F(I)-T
4              F(I)=F(I)+T
5           CONTINUE
      DO 6 I=1,N
6        F(I)=F(I)/FLOAT(N)
      RETURN
      END
```

Figure 3.26 Modification of the successive-doubling FFT algorithm for computing the fast Walsh transform.

of Eq. (3.5-25) into Eq. (3.5-1) yields the following expression for the one-dimensional Hadamard transform:

$$H(u) = \frac{1}{N}\sum_{x=0}^{N-1} f(x)(-1)^{\sum_{i=0}^{n-1} b_i(x)b_i(u)} \qquad (3.5\text{-}26)$$

where $N = 2^n$, and $u$ assumes values in the range $0, 1, 2, \ldots, N-1$.

As in the case of the Walsh transform, the Hadamard kernel forms a matrix whose rows and columns are orthogonal. This condition again leads to an inverse kernel that, except for the $1/N$ term, is equal to the forward Hadamard kernel: that is, $$h(x, u) = (-1)^{\sum_{i=0}^{n-1} b_i(x)b_i(u)} \qquad (3.5\text{-}27)$$

Substitution of this kernel into Eq. (3.5-2) yields the following expression for the inverse Hadamard transform:

$$f(x) = \sum_{u=0}^{N-1} H(u)(-1)^{\sum_{i=0}^{n-1} b_i(x)b_i(u)} \qquad (3.5\text{-}28)$$

for $x = 0, 1, 2, \ldots, N-1$.

The two-dimensional kernels are similarly given by the relations $$g(x, y, u, v) = \frac{1}{N}(-1)^{\sum_{i=0}^{n-1} [b_i(x)b_i(u)+b_i(y)b_i(v)]} \qquad (3.5\text{-}29)$$

and $$h(x, y, u, v) = \frac{1}{N}(-1)^{\sum_{i=0}^{n-1} [b_i(x)b_i(u)+b_i(y)b_i(v)]} \qquad (3.5\text{-}30)$$

where the summation in the exponent is again carried out in modulo 2 arithmetic. It is noted that, as in the case of the Walsh transform, the two dimensional Hadamard kernels are identical.

Substitution of Eqs. (3.5-29) and (3.5-30) into Eqs. (3.5-3) and (3.5-4) yields the following two-dimensional Hadamard transform pair:

$$H(u,v)=\frac{1}{N}\sum_{x=0}^{N-1}\sum_{y=0}^{N-1}f(x,y)(-1)^{\sum_{i=0}^{n-1}[b_i(x)b_i(u)+b_i(y)b_i(v)]} \quad (3.5\text{-}31)$$

and $$f(x,y)=\frac{1}{N}\sum_{u=0}^{N-1}\sum_{v=0}^{N-1}H(u,v)(-1)^{\sum_{i=0}^{n-1}[b_i(x)b_i(u)+b_i(y)b_i(v)]} \quad (3.5\text{-}32)$$

Since the forward and inverse transforms are identical, an algorithm used for computing $H(u, v)$ can be used without modification to obtain $f(x, y)$, and vice versa. It can also be shown by keeping in mind the modulo 2 summation that the Hadamard kernels are separable and symmetric. It therefore follows that $$\begin{aligned} g(x,y,u,v) &= g_1(x,u)g_1(y,v) \\ &= h_1(x,u)h_1(y,v) \\ &= \left[\frac{1}{\sqrt{N}}(-1)^{\sum_{i=0}^{n-1} b_i(x)b_i(u)}\right]\left[\frac{1}{\sqrt{N}}(-1)^{\sum_{i=0}^{n-1} b_i(y)b_i(v)}\right]. \end{aligned} \quad (3.5\text{-}33)$$

With the exception of the $1/\sqrt{N}$ term, $g_1$ and $h_1$ are identical to Eq. (3.5-25). It is also noted that, since the two-dimensional Hadamard kernels are separable, the two-dimensional transform pair can be obtained by successive applications of any one-dimensional Hadamard transform algorithm.

The matrix of values produced by the one-dimensional Hadamard kernel given in Eq. (3.5-25) is shown in Table 3.4 for $N = 8$, where the constant $1/N$ term has been omitted for simplicity. It is noted that, although the entries in this table are the same as for the Walsh transform, the order of the rows and columns is different. In fact, when $N = 2^n$, this is the only difference between these two transforms. When $N$ is not equal to an integer power of 2, the difference is more important. While the Walsh transform can be formulated for any positive integer value of $N$, existence of the Hadamard transform for values of $N$ other than integer powers of 2 has been shown only up to $N = 200$.

Since most of the applications of transforms in image processing are based on $N = 2^n$ samples per row or column of an image, the use (and terminology) of the Walsh and Hadamard transforms is intermixed in the image processing literature, where the term Walsh–Hadamard transform is often used to denote either transform.

Two important features that might influence the choice of one of these transforms over the other are worth noting. As indicated in Section 3.5.2, the formulation

Table 3.4 Values of the Hadamard Transformation Kernel for $N = 8$

| u \ x | 0 | 1 | 2 | 3 | 4 | 5 | 6 | 7 |
|---|---|---|---|---|---|---|---|---|
| 0 | + | + | + | + | + | + | + | + |
| 1 | + | − | + | − | + | − | + | − |
| 2 | + | + | − | − | + | + | − | − |
| 3 | + | − | − | + | + | − | − | + |
| 4 | + | + | + | + | − | − | − | − |
| 5 | + | − | + | − | − | + | − | + |
| 6 | + | + | − | − | − | − | + | + |
| 7 | + | − | − | + | − | + | + | − |

given in Eq. (3.5-15) has the advantage that it can be expressed directly in a successive-doubling format. This allows computation of the FWT by a straightforward modification of the FFT algorithm developed in Section 3.4.1. Further modifications of doubling format. This allows computation of the FWT by a straightforward modification of the FFT algorithm developed in Section 3.4.1. Further modifications of this algorithm would be required to compute the fast Hadamard transform (FHT)

to take into account the difference in ordering. An alternative approach is to use the FWT algorithm of Fig. 3.24 and then reorder the results to obtain the Hadamard transform.

Although the Hadamard ordering has disadvantages in terms of a successive-doubling implementation, it leads to a simple recursive relationship for the generation of the transformation matrices needed to implement Eqs. (3.5-10) and (3.5-12). The Hadamard matrix of lowest order (i.e., $N = 2$) is given by $$\mathbf{H}_2 = \begin{bmatrix} 1 & 1 \\ 1 & -1 \end{bmatrix} \qquad (3.5\text{-}34)$$

Then, letting $\mathbf{H}_N$ represent the matrix of order $N$, the recursive relationship is given by the expression $$\mathbf{H}_{2N} = \begin{bmatrix} \mathbf{H}_N & \mathbf{H}_N \\ \mathbf{H}_N & -\mathbf{H}_N \end{bmatrix} \qquad (3.5\text{-}35)$$

where $\mathbf{H}_{2N}$ is the Hadamard matrix of order $2N$, and it is assumed that $N = 2^n$.

The transformation matrix for use in Eq. (3.5-10) is obtained by normalizing the corresponding Hadamard matrix by the square root of the matrix order. Thus in the $N \times N$ case, these two matrices are related by the equation $$\mathbf{A} = \frac{1}{\sqrt{N}} \mathbf{H}_N. \qquad (3.5\text{-}36)$$

The expressions for the inverse Hadamard matrix are identical to Eqs. (3.5-34) through (3.5-36).

Example: Use of Eq. (3.5-34) and (3.5-35) leads to the following Hadamard matrices of order four and eight:

$$\mathbf{H}_4 = \begin{bmatrix} \mathbf{H}_2 & \mathbf{H}_2 \\ \mathbf{H}_2 & -\mathbf{H}_2 \end{bmatrix} = \begin{bmatrix} + & + & + & + \\ + & - & + & - \\ + & + & - & - \\ + & - & - & + \end{bmatrix}$$

and $$\mathbf{H}_8 = \begin{bmatrix} \mathbf{H}_4 & \mathbf{H}_4 \\ \mathbf{H}_4 & -\mathbf{H}_4 \end{bmatrix} = \begin{bmatrix} + & + & + & - & - & + & + & + \\ + & - & + & - & - & - & + & - \\ + & + & - & - & - & + & - & - \\ + & - & - & - & + & - & - & + \\ + & + & + & - & - & - & - & - \\ + & - & + & - & - & + & - & + \\ + & + & - & - & - & - & + & + \\ + & - & - & - & - & + & + & - \end{bmatrix}$$

where + and − indicate +1 and −1, respectively.

As shown in Eqs. (3.5-25) and (3.5-33), $g(x, u)$ and $g_1(x, u)$ differ only by a constant multiplier term. Since $a_{ij} = g_1(i, j)$, it follows that the entries in the $\mathbf{A}$ matrix have the same form as the expansion of $g(x, u)$. This is easily seen, for example, by comparing Table 3.4 and the expression for $\mathbf{A} = \frac{1}{\sqrt{8}} \mathbf{H}_8$. □

The number of sign changes along a column of the Hadamard matrix is often called the *sequency* of that column.[†] Since the elements of this matrix are derived from the kernel values, the sequency concept applies to the expansion of $g_1(x, u)$ for $x, u = 0, 1, \ldots, N - 1$. For instance, the sequencies of the eight columns of $\mathbf{H}_8$ and Table 3.4 are 0, 7, 3, 4, 1, 6, 2, and 5.

It is often of interest to express the Hadamard kernels so that the sequency increases as a function of increasing $u$. This formulation is analogous to the Fourier transform, where frequency also increases as a function of increasing $u$. The one-dimensional Hadamard kernel that achieves this particular ordering is given by the relation $$g(x, u) = \frac{1}{N}(-1)^{\sum_{i=0}^{n-1} b_i(x)p_i(u)} \qquad (3.5\text{-}37)$$

where $$\begin{aligned} p_0(u) &= b_{n-1}(u), \\ p_1(u) &= b_{n-1}(u) + b_{n-2}(u), \\ p_2(u) &= b_{n-2}(u) + b_{n-3}(u), \\ &\vdots \\ p_{n-1}(u) &= b_1(u) - b_0(u). \end{aligned} \qquad (3.5\text{-}38)$$

*As in the case of the Fourier transform, where $u$ is a frequency variable, the concept of sequency is normally restricted to this variable. Thus the association of sequency with the columns of the Hadamard matrix is based on the assumption that the columns vary as a function of $u$ and the rows as a function of $x$. This convention is used in Table 3.4.

As before, the summations in Eqs. (3.5-37) and (3.5-38) are performed in modulo 2 arithmetic. The expansion of Eq. (3.5-37) is shown in Table 3.5 for $N = 8$, where the constant multiplier term has been omitted for simplicity and the + and − entries indicate +1 and −1, respectively. It is noted that the columns and, by symmetry, the rows of this table are in order of increasing sequency.

The inverse, ordered Hadamard kernel is given by the expression $$h(x, u) = (-1)^{\sum_{i=0}^{n-1} b_i(x)p_i(u)} \qquad (3.5\text{-}39)$$

where $p_i(u)$ is computed using Eq. (3.5-38). Substitution of the forward and inverse kernels into Eqs. (3.5-1) and (3.5-2) yields the following ordered Hadamard transform pair:

$$H(u) = \frac{1}{N}\sum_{x=0}^{N-1} f(x)(-1)^{\sum_{i=0}^{n-1} b_i(x)p_i(u)} \qquad (3.5\text{-}40)$$

and $$f(x) = \sum_{u=0}^{N-1} H(u)(-1)^{\sum_{i=0}^{n-1} b_i(x)p_i(u)} \qquad (3.5\text{-}41)$$

As in the unordered case, the two-dimensional kernels are separable and identical; they are given by the relations $$\begin{aligned} g(x,y,u,v) &= h(x,y,u,v) \\ &= \frac{1}{N}(-1)^{\sum_{i=0}^{n-1} [b_i(x)p_i(u)+b_i(y)p_i(v)]} \end{aligned} \qquad (3.5\text{-}42)$$

Substitution of these kernels into Eqs. (3.5-3) and (3.5-4) yields the following two-dimensional, ordered Hadamard transform pair:

$$H(u, v) = \frac{1}{N}\sum_{x=0}^{N-1}\sum_{y=0}^{N-1} f(x,y)(-1)^{\sum_{i=0}^{n-1} [b_i(x)p_i(u)+b_i(y)p_i(v)]} \qquad (3.5\text{-}43)$$

Table 3.5 Values of the Ordered Hadamard Kernel for $N = 8$

| $u$ \ $x$ | 0 | 1 | 2 | 3 | 4 | 5 | 6 | 7 |
|---|---|---|---|---|---|---|---|---|
| 0 | + | + | + | + | + | + | + | + |
| 1 | + | + | + | + | − | − | − | − |
| 2 | + | + | − | − | − | − | + | + |
| 3 | + | + | − | − | + | + | − | − |
| 4 | + | − | − | + | + | − | − | + |
| 5 | + | − | − | + | − | + | + | − |
| 6 | + | − | + | − | − | + | − | + |
| 7 | + | − | + | − | + | − | + | − |

and $$f(x, y) = \frac{1}{N} \sum_{u=0}^{N-1} \sum_{v=0}^{N-1} H(u, v)(-1)^{\sum_{i=0}^{n-1} [b_i(x)p_i(u) + b_i(y)p_i(v)]} \qquad (3.5\text{-}44)$$

3.5.3 Discrete Cosine Transform

The forward kernel of the one-dimensional, Discrete Cosine transform (DCT) is given by the relations $$g(x, 0) = \frac{1}{\sqrt{N}} \qquad (3.5\text{-}45a)$$

$$g(x, u) = \sqrt{\frac{2}{N}} \cos \frac{(2x+1)u\pi}{2N} \qquad (3.5\text{-}45b)$$

for $x = 0, 1, \ldots, N-1$ and $u = 1, 2, \ldots, N-1$. Substitution of these expressions into Eq. (3.5-1) yields $$C(0) = \frac{1}{\sqrt{N}} \sum_{x=0}^{N-1} f(x) \qquad (3.5\text{-}46a)$$

$$C(u) = \sqrt{\frac{2}{N}} \sum_{x=0}^{N-1} f(x) \cos \frac{(2x+1)u\pi}{2N}, \qquad (3.5\text{-}46b)$$

where $C(u)$, $u = 0, 1, 2, \ldots, N-1$, is the DCT of $f(x)$.

The inverse kernel is of the same form as in Eq. (3.5-45), and the inverse DCT is defined by the equation $$f(x) = \frac{1}{\sqrt{N}} C(0) + \sqrt{\frac{2}{N}} \sum_{u=1}^{N-1} C(u) \cos \frac{(2x+1)u\pi}{2N} \qquad (3.5\text{-}47)$$

for $x = 0, 1, 2, \ldots, N-1$.

The two-dimensional forward DCT kernel is defined as $$g(x, y, 0, 0) = \frac{1}{N} \qquad (3.5\text{-}48a)$$

$$g(x, y, u, v) = \frac{1}{2N^3} [\cos(2x+1)u\pi][\cos(2y+1)v\pi] \qquad (3.5\text{-}48b)$$

for $x, y = 0, 1, \ldots, N-1$, and $u, v = 1, 2, \ldots, N-1$. The inverse kernel is also of this form. Thus it follows from Eqs. (3.5-3) and (3.5-4) that the two-dimensional DCT pair is given by the expressions $$C(0, 0) = \frac{1}{N} \sum_{x=0}^{N-1} \sum_{y=0}^{N-1} f(x, y) \qquad (3.5\text{-}49a)$$

$$C(u, v) = \frac{1}{2N^3} \sum_{x=0}^{N-1} \sum_{y=0}^{N-1} f(x, y)[\cos(2x+1)u\pi][\cos(2y+1)v\pi] \qquad (3.5\text{-}49b)$$

for $u, v = 1, 2, \ldots, N-1$, and $$f(x, y) = \frac{1}{N} C(0, 0) + \frac{1}{2N^3} \sum_{u=1}^{N-1} \sum_{v=1}^{N-1} C(u, v)[\cos(2x+1)u\pi][\cos(2y+1)v\pi] \qquad (3.5\text{-}50)$$

for $x, y = 0, 1, \ldots, N-1$.

By comparing Eqs. (3.5-45) and (3.5-48) we note that DCT transformation kernels are separable, so that the two-dimensional forward or inverse transform can be computed by successive applications of a one-dimensional DCT algorithm. In fact, an interesting property of the DCT is that it can be obtained directly from an FFT algorithm. This can be seen by expressing Eq. (3.5-46) in the equivalent form $$C(0) = \frac{1}{\sqrt{N}} \sum_{x=0}^{N-1} f(x) \qquad (3.5\text{-}51a)$$

and $$C(u) = \sqrt{\frac{2}{N}} \operatorname{Re} \left\{ \left[ \exp\left( \frac{-j\pi u}{2N} \right) \right] \sum_{x=0}^{2N-1} f(x) \exp\left( \frac{-j\pi ux}{N} \right) \right\} \qquad (3.5\text{-}51b)$$

where $u = 1, 2, \ldots, N-1$; $f(x) = 0$ for $x = N, N+1, \ldots, 2N-1$; and Re $\{\cdot\}$ denotes the real part of the term enclosed. The summation term is recognized as a $2N$-point discrete Fourier transform. Similarly, a $2N$-point inverse FFT can be used to obtain $f(x)$ from $C(u)$.

3.6 THE HOTELLING TRANSFORM

Unlike the transforms discussed previously, the *Hotelling transform*† developed in this section is based on statistical properties of an image. The principal uses of this transform are in data compression and rotation applications.

As an introduction to the problem, suppose that an $N \times N$ image $f(x, y)$ is transmitted $M$ times over some communication channel. Since any physical channel is subject to random disturbances, the set of received images, $\{f_1(x, y), f_2(x, y), \ldots f_M(x, y)\}$, will in general represent a statistical ensemble whose properties are determined by the channel characteristics and the nature of the disturbance. An example of such an ensemble is the set of images of the same scene transmitted by a space probe. In this case, the images are corrupted by atmospheric disturbances and electrical noise in the transmitter and receiver.

†This transform is also commonly referred to as the *eigenvector, principal component*, or *discrete Karhunen–Loève transform*.

3.6.1 Formulation

Each sample image $f_i(x, y)$ can be expressed in the form of an $N^2$-dimensional vector $\mathbf{x}_i$ as follows:

$$\mathbf{x}_i = \begin{bmatrix} x_{i1} \\ x_{i2} \\ \vdots \\ x_{ij} \\ \vdots \\ x_{iN^2} \end{bmatrix} \tag{3.6-1}$$

where $x_{ij}$ denotes the $j$th component of vector $\mathbf{x}_i$. One way to construct such a vector is to let the first $N$ components of $\mathbf{x}_i$ be formed from the first row of $f_i(x, y)$ [i.e., $x_{i1} = f(0, 0)$, $x_{i2} = f(0, 1)$, $\ldots$, $x_{iN} = f(0, N-1)$]; the second set of $N$ components from the second row; and so on. Another way is to use the columns of $f(x, y)$ instead of the rows. Of course, other representations are possible, but these two are the ones used most often.

The covariance matrix of the $\mathbf{x}$ vectors is defined as $$\mathbf{C}_x = E\{(\mathbf{x} - \mathbf{m}_x)(\mathbf{x} - \mathbf{m}_x)'\}, \tag{3.6-2}$$

where $$\mathbf{m}_x = E\{\mathbf{x}\} \tag{3.6-3}$$

is the mean vector, $E$ is the expected value, and the prime (′) indicates transposition. Equations (3.6-2) and (3.6-3) can be approximated from the samples by using the relations $$\mathbf{m}_x \cong \frac{1}{M}\sum_{i=1}^{M} \mathbf{x}_i \tag{3.6-4}$$

and $$\mathbf{C}_x \cong \frac{1}{M}\sum_{i=1}^{M} (\mathbf{x}_i - \mathbf{m}_x)(\mathbf{x}_i - \mathbf{m}_x)' \tag{3.6-5a}$$

or, equivalently, $$\mathbf{C}_x \cong \frac{1}{M}\left[\sum_{i=1}^{M} \mathbf{x}_i\mathbf{x}_i'\right] - \mathbf{m}_x\mathbf{m}_x'. \tag{3.6-5b}$$

The mean vector is of dimensionality $N^2$ and $\mathbf{C}_x$ is an $N^2 \times N^2$ matrix.

Let $\mathbf{e}_i$ and $\lambda_i$, $i = 1, 2, \ldots, N^2$, be the eigenvectors and corresponding eigenvalues of $\mathbf{C}_x$. It is assumed for convenience in notation that the eigenvalues have been arranged in decreasing order so that $\lambda_1 \geq \lambda_2 \geq \cdots \geq \lambda_{N^2}$. A transformation matrix whose rows are the eigenvectors of $\mathbf{C}_x$ is given by $$\mathbf{A} = \begin{bmatrix} e_{11} & e_{12} \cdots e_{1N^2} \\ e_{21} & e_{22} \cdots e_{2N^2} \\ \vdots & \\ e_{N^21} & e_{N^22} \cdots e_{N^2N^2} \end{bmatrix} \quad (3.6\text{-}6)$$

where $e_{ij}$ is the $j$th component of the $i$th eigenvector. The Hotelling transform then consists simply of multiplying a centralized image vector, $(\mathbf{x} - \mathbf{m}_x)$, by $\mathbf{A}$ to obtain a new image vector $\mathbf{y}$; that is, $$\mathbf{y} = \mathbf{A}(\mathbf{x} - \mathbf{m}_x). \quad (3.6\text{-}7)$$

Equation (3.6-7) has several important properties. Let us first examine the covariance matrix of the $\mathbf{y}$ vectors. This matrix is given by $$\mathbf{C}_y = E\{(\mathbf{y} - \mathbf{m}_y)(\mathbf{y} - \mathbf{m}_y)'\}, \quad (3.6\text{-}8)$$

where $\mathbf{m}_y$ is equal to the zero vector $\mathbf{0}$ as can be shown directly from Eqs. (3.6-3) and (3.6-7):

$$\begin{aligned} \mathbf{m}_y &= E\{\mathbf{y}\} \\ &= E\{\mathbf{A}(\mathbf{x} - \mathbf{m}_x)\} \\ &= \mathbf{A}E\{\mathbf{x}\} - \mathbf{A}\mathbf{m}_x \\ &= \mathbf{0}. \end{aligned} \quad (3.6\text{-}9)$$

Substitution of Eqs. (3.6-7) and (3.6-9) into Eq. (3.6-8) yields the following expressions for $\mathbf{C}_y$ in terms of $\mathbf{C}_x$:

$$\begin{aligned} \mathbf{C}_y &= E\{(\mathbf{A}\mathbf{x} - \mathbf{A}\mathbf{m}_x)(\mathbf{A}\mathbf{x} - \mathbf{A}\mathbf{m}_x)'\} \\ &= E\{\mathbf{A}(\mathbf{x} - \mathbf{m}_x)(\mathbf{x} - \mathbf{m}_x)'\mathbf{A}'\} \\ &= \mathbf{A}E\{(\mathbf{x} - \mathbf{m}_x)(\mathbf{x} - \mathbf{m}_x)'\}\mathbf{A}' \\ &= \mathbf{A}\mathbf{C}_x\mathbf{A}', \end{aligned} \quad (3.6\text{-}10)$$

where the last step follows from the definition of $\mathbf{C}_x$ given in Eq. (3.6-2).

It can be shown (Lawley and Maxwell [1963]) that $\mathbf{C}_y$ is a diagonal matrix with elements equal to the eigenvalues of $\mathbf{C}_x$; that is, $$\mathbf{C}_y = \begin{bmatrix} \lambda_1 & & & 0 \\ & \lambda_2 & & \\ & & \ddots & \\ 0 & & & \lambda_{N^2} \end{bmatrix} \quad (3.6\text{-}11)$$

The importance of this property is that, since the terms off the main diagonal are 0, the elements of y are *uncorrelated*. In addition, each eigenvalue $\lambda_i$ is equal to the variance of the *i*th element of y along eigenvector $e_i$.

Another property, which will be shown in Chapter 6 to be useful for image coding, deals with the reconstruction of x from y. Since $C_x$ is a real, symmetric matrix it is always possible to find a set of orthonormal eigenvectors (Noble [1969]). It therefore follows that $A^{-1} = A'$ and x can be reconstructed from y by using the relation $$x = A'y - m_x. \quad (3.6\text{-}12)$$

Suppose, however, that instead of using all the eigenvectors of $C_x$, we form A from the $K$ eigenvectors corresponding to the largest eigenvalues. The y vectors will then be $K$-dimensional and the reconstruction given by Eq. (3.6-12) will no longer be exact. Let $$\hat{x} = A_K'y + m_x \quad (3.6\text{-}13)$$

represent the approximation to x obtained with a transformation matrix $A_K$ composed of the first $K$ eigenvectors of $C_x$. It can be shown that the mean square error $R$ between x and $\hat{x}$ is given by the expression $$R = \sum_{j=1}^{N^2} \lambda_j - \sum_{j=1}^{K} \lambda_j \quad (3.6\text{-}14a)$$

$$= \sum_{j=K+1}^{N^2} \lambda_j. \quad (3.6\text{-}14b)$$

From Eq. (3.6-14a) we see that the error is zero if $K = N^2$ (i.e., if all the eigenvectors are used in the transformation). Since the $\lambda_j$'s decrease monotonically, either form of Eq. (3.6-14) shows that the error is minimized by selecting the eigenvectors associated with the largest eigenvalues. Thus the Hotelling transform is optimal in the least-square-error sense.

The development of the Hotelling transform given above is quite different from the general approach presented in Section 3.5. The reason for this is that the Hotelling transformation matrix is not separable, thus precluding the use of Eq. (3.5-10). However, although this matrix is not separable, a fast algorithm based on using FFTs to obtain the Hotelling transform has been developed by Jain [1975].

3.6.2 Application to Image Rotation

One of the basic concepts underlying the derivation of the Hotelling transform is that the choice of basis vectors (i.e., rows of A) is made such that these vectors point in the direction of maximum variance of the data, subject to the constraint that all vectors be mutually orthogonal and the transformed components be uncorrelated. These requirements lead to the solution stated above that the bases are the eigenvectors of the covariance matrix. The required orientation of the eigenvectors leads to the optimal properties of the Hotelling transform since, when fewer than $N^2$ vectors are used in A, the basis vectors selected correspond to the direction of largest variance in the data.

These properties can be used to advantage in image rotation. Let us consider the problem where an object has been extracted from an image and it is desired to rotate the object so that it is aligned in some standard or invariant direction. Many objects of interest in image processing applications (particularly man-made objects) can be easily standardized by performing a rotation that aligns the coordinate axes with the axes of maximum variance of the pixels in the object.

Consider the coordinate system with the $x_1$ and $x_2$ axes shown in Fig. 3.27. If new coordinates are chosen, with a different orientation but the same origin as the original system, then we shall say that there has been a rotation of axes in the plane. Let $\theta$ be the angle of rotation from the positive half of the $x_1$ axis to the positive half of the $y_1$ axis. It then follows from elementary trigonometry that the new and old axes are related by the equations $$\begin{aligned} y_1 &= x_1 \cos\theta + x_2 \sin\theta \\ y_2 &= -x_1 \sin\theta + x_2 \cos\theta \end{aligned} \quad (3.6\text{-}15)$$

or $$\begin{bmatrix} y_1 \\ y_2 \end{bmatrix} = \begin{bmatrix} \cos\theta & \sin\theta \\ -\sin\theta & \cos\theta \end{bmatrix} \begin{bmatrix} x_1 \\ x_2 \end{bmatrix} \quad (3.6\text{-}16)$$

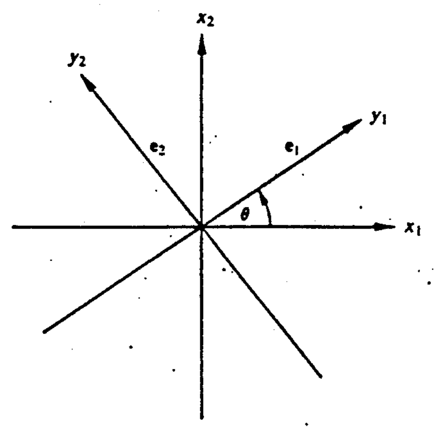

Figure 3.27 Rotation of coordinate system.

The original coordinates of each pixel in the object can be interpreted as two-dimensional random variables with mean $$\mathbf{m}_x = \frac{1}{P}\sum_{i=1}^{P}\mathbf{x}_i \tag{3.6-17}$$

and covariance matrix $$\mathbf{C}_x = \frac{1}{P}\left[\sum_{i=1}^{P}\mathbf{x}_i\mathbf{x}_i'\right] - \mathbf{m}_x\mathbf{m}_x'. \tag{3.6-18}$$

where $P$ is the number of pixels in the object to be rotated and $\mathbf{x}_i$ is the vector composed of the coordinates of the $i$th pixel. It is noted that $\mathbf{m}_x$ is a two-dimensional vector and $\mathbf{C}_x$ a $2 \times 2$ matrix.

Since the eigenvectors of $\mathbf{C}_x$ point in the directions of maximum variance (subject to the constraint that they be orthogonal), a logical choice is to select the new coordinate system so that it will be aligned with these eigenvectors.

If we let the $y_1$ and $y_2$ axes be aligned with the *normalized* eigenvectors $\mathbf{e}_1$ and $\mathbf{e}_2$, it then follows from Fig. 3.27 that $\cos\theta = e_{11}$, $\sin\theta = e_{12}$, $-\sin\theta = e_{21}$, and $\cos\theta = e_{22}$, where $e_{11}$ and $e_{21}$ are the projections of $\mathbf{e}_1$ and $\mathbf{e}_2$ along the $x_1$ axis, and $e_{12}$ and $e_{22}$ are the projections of these two vectors along the $x_2$ axis. The rotation from the original coordinate system to this new system is then given by the relation.

$$\begin{bmatrix} y_1 \\ y_2 \end{bmatrix} = \begin{bmatrix} e_{11} & e_{12} \\ e_{21} & e_{22} \end{bmatrix}\begin{bmatrix} x_1 \\ x_2 \end{bmatrix} \tag{3.6-19}$$

which is seen to be in the familiar form $\mathbf{y} = \mathbf{A}\mathbf{x}$, where $$\mathbf{A} = \begin{bmatrix} e_{11} & e_{12} \\ e_{21} & e_{22} \end{bmatrix} \tag{3.6-20a}$$

$$= \begin{bmatrix} \cos\theta & \sin\theta \\ -\sin\theta & \cos\theta \end{bmatrix} \tag{3.6-20b}$$

It is noted that Eq. (3.6-19) is analogous to a two-dimensional Hotelling transform where the mean has not been subtracted from the original vectors. Subtraction of the mean vector simply centralizes the object so that its center of gravity is at the origin of the new coordinate system. In this case, the transformation assumes the form $\mathbf{y} = \mathbf{A}(\mathbf{x} - \mathbf{m}_x)$.

Interpretation of Eq. (3.6-19) is different in another respect from our earlier discussion of the Hotelling transform, where each vector was formed from pixels in an entire image. In the present application, we are concerned with the *coordinates* of pixels in a *single* image, and the ensemble of vectors used to arrive at the transformation matrix is derived from an object in the image.

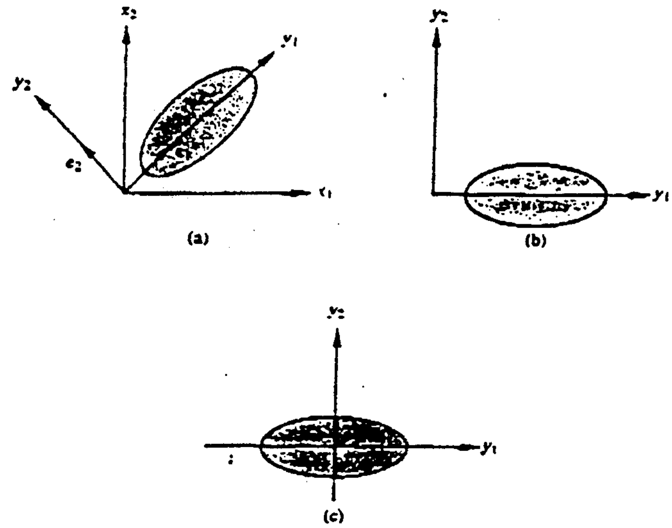

Figure 3.28 Rotation of a two-dimensional object. (a) Original data scatter showing direction of unit eigenvectors. (b) Data rotated by using the transformation $\mathbf{y} = \mathbf{Ax}$. (c) Data rotated and centralized by using the transformation $\mathbf{y} = \mathbf{A}(\mathbf{x} - \mathbf{m}_x)$.

The rotation–translation procedure is summarized in Fig. 3.28. Part (a) of this figure shows a simple object and the $y_1$ and $y_2$ axes chosen in the direction of their normalized eigenvectors. Figure 3.28(b) shows the object in the new coordinate system. Finally, Fig. 3.28(c) shows the result of rotation after the mean was subtracted from the data.

It is important to note that, if $\mathbf{e}_1$ and $\mathbf{e}_2$ are valid eigenvectors, the pairs $(\mathbf{e}_1, -\mathbf{e}_2)$, $(-\mathbf{e}_1, \mathbf{e}_2)$, and $(-\mathbf{e}_1, -\mathbf{e}_2)$ are also valid. Since the foregoing rotation procedure is based on a right-handed coordinate system, the choice of direction of the eigenvectors must be taken into account. Failure to do so can produce rotated results which are reflected about the origin in one or both of the new axes. Figure 3.29 illustrates the results of rotation for all possible directions of the eigenvectors;[†] the rotation in each case was obtained by aligning the $y_1$ axis with $\mathbf{e}_1$, which is the eigenvector associated with the largest variance. Note that Fig. 3.29(a) shows the expected results. Figure 3.29(b) is based on a left-handed coordinate system and yields data

[†] Since the eigenvectors of the covariance matrix point in the directions of maximum variance, the only possible deviation of each vector is a change in sign.

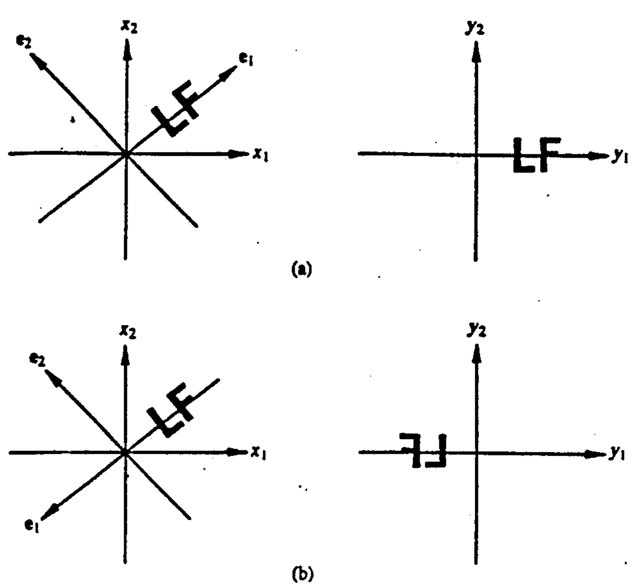

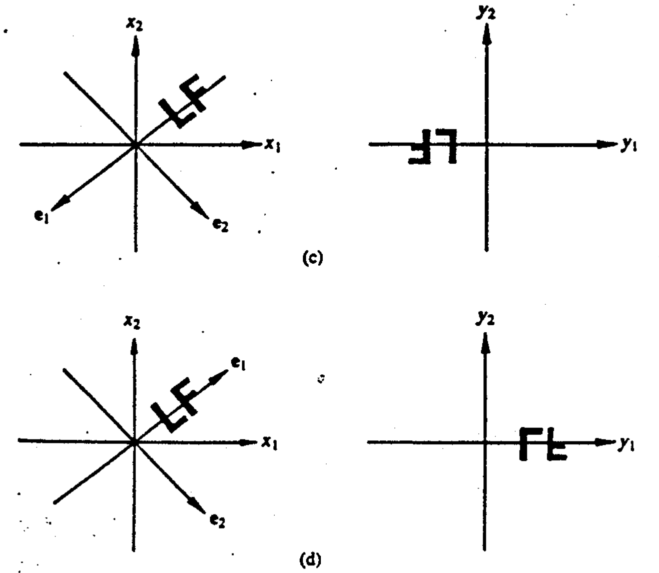

Figure 3.29 Example of possible directions of eigenvectors and corresponding rotation results.

that are reflected about the origin in the $y_1$ axis. Figure 3.29(c) is based on a right-handed system, but it also shows reflection about both axes. Actually this result is not incorrect: it merely points out the fact that it is not uncommon in practice to obtain the negative of the expected eigenvectors from a computational algorithm. Reversing the direction of both vectors would yield the same result as in Fig. 3.29(a). Finally, Fig. 3.29(d) again shows the reflection due to an improper coordinate system. It is noted that a right-handed system may or may not yield reflected results, but that a left-handed system will always be accompanied by this problem. In practice, the most common approach is to use a right-handed system and make provisions to handle both possible orientations of $\mathbf{e}_1$ and $\mathbf{e}_2$ in this system.

3.7 THE HOUGH TRANSFORM

Unlike the transforms discussed thus far, the concepts presented in this section deal with the detection of specific structural relationships between pixels in an image. As an introduction to this problem, suppose that given $n$ points in an image we wish to find subsets of these points that lie on straight lines.* One possible solution is to first find all lines determined by every pair of points and then find all subsets of points that are close to particular lines. The problem with this procedure is that it involves finding $n(n - 1)/2 \sim n^2$ lines and then performing $(n)(n(n - 1))/2 \sim n^3$ comparisons of every point to all lines. This is computationally prohibitive in all but the most trivial applications.

This problem may be viewed in a different way using an approach proposed by Hough [1962] and commonly referred to as the *Hough transform.* Consider a point $(x_i, y_i)$ and the general equation of a straight line in slope–intercept form, $y_i = ax_i + b$. There is an infinite number of lines that pass through $(x_i, y_i)$, but they all satisfy the equation $y_i = ax_i + b$ for varying values of $a$ and $b$. However, if we write this equation as $b = -x_i a + y_i$, and consider the $ab$ plane (also called *parameter space*), then we have the equation of a *single* line for a fixed pair $(x_i, y_i)$. Furthermore, a second point $(x_j, y_j)$ will also have a line in parameter space associated with it, and this line will intersect the line associated with $(x_i, y_i)$ at $(a', b')$, where $a'$ is the slope and $b'$ the intercept of the line containing both $(x_i, y_i)$ and $(x_j, y_j)$ in the $xy$ plane. In fact, all points contained on this line will have lines in parameter space that intersect at $(a', b')$. These concepts are illustrated in Fig. 3.30.

The computational attractiveness of the Hough transform arises from subdividing the parameter space into so-called *accumulator cells*, as illustrated in Fig. 3.31, where $(a_{max}, a_{min})$ and $(b_{max}, b_{min})$ are the expected ranges of slope and intercept values. The cell at coordinates $(i, j)$, with accumulator value $A(i, j)$, corresponds to the square associated with parameter space coordinates $(a_i, b_j)$. Initially, these

* Typically, the points in question have been identified as being unique in some way, such as being edge pixels with intensities that exceed a given threshold value.

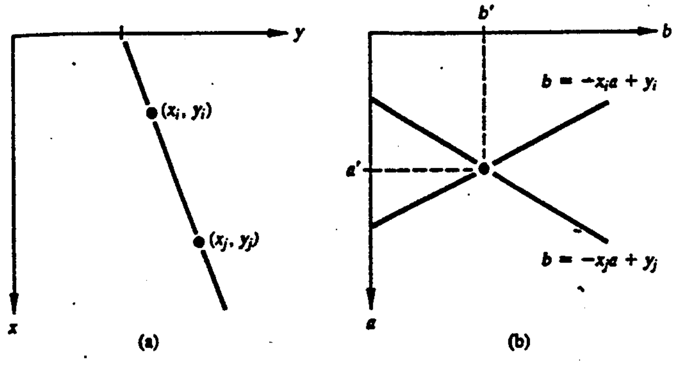

Figure 3.30 (a) *xy* plane. (b) Parameter space.

cells are set to zero. Then, for every point $(x_k, y_k)$ in the image plane, we let the parameter $a$ equal each of the allowed subdivision values on the $a$ axis and solve for the corresponding $b$ using the equation $b = -x_k a + y_k$. The resulting $b$'s are then rounded off to the nearest allowed value in the $b$ axis. If a choice of $a_p$ results in solution $b_q$, we let $A(p, q) = A(p, q) + 1$. At the end of this procedure, a value of $M$ in $A(i, j)$ corresponds to $M$ points in the $xy$ plane lying on the line $y = a_i x + b_j$. The accuracy of the collinearity of these points is established by the number of subdivisions in the $ab$ plane.

It is noted that if we subdivide the $a$ axis into $K$ increments, then for every point $(x_k, y_k)$ we obtain $K$ values of $b$ corresponding to the $K$ possible values of $a$. Since there are $n$ image points, this involves $nK$ computations. Thus the procedure just discussed is *linear* in $n$, and the product $nK$ does not approach the number of

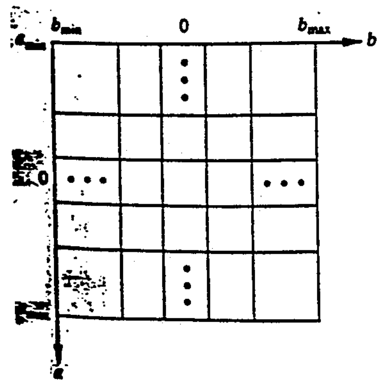

Figure 3.31 Quantization of the parameter plane for use in the Hough transform.

computations discussed at the beginning of this section unless $K$ approaches or exceeds $n$.

A problem with using the equation $y = ax + b$ to represent a line is that both the slope and intercept approach infinity as the line approaches a vertical position. One way around this difficulty is to use the normal representation of a line, given by $$x \cos \theta + y \sin \theta = \rho. \qquad (3.7\text{-}1)$$

The meaning of the parameters used in Eq. (3.7-1) is illustrated in Fig. 3.32(a). The use of this representation in constructing a table of accumulators is identical to the method discussed above for the slope–intercept representation. Instead of straight lines, however, we now have as loci sinusoidal curves in the $\rho\theta$ plane. As before, $M$ collinear points lying on a line $x \cos \theta_j + y \sin \theta_j = \rho_i$ will yield $M$ sinusoidal curves that intersect at $(\rho_i, \theta_j)$ in the parameter space. When we use the method of incrementing $\theta$ and solving for the corresponding $\rho$, the procedure will yield $M$ entries in accumulator $A(i, j)$ associated with the cell determined by $(\rho_i, \theta_j)$. The subdivision of the parameter space is illustrated in Fig. 3.32(b).

The range of angle $\theta$ is $\pm 90°$, measured with respect to the $x$ axis. Thus with reference to Fig. 3.32(a), a horizontal line has $\theta = 0°$, with $\rho$ being equal to the positive $x$ intercept. Similarly, a vertical line has $\theta = 90°$, with $\rho$ being equal to the positive $y$ intercept, or $\theta = -90°$, with $\rho$ being equal to the negative $y$ intercept.

Example: An illustration of the Hough transform based on Eq. (3.7-1) is shown in Fig. 3.33. Part (a) of this figure shows an image with five labeled points. The mapping of each of these points into the $\rho\theta$ plane is shown in Fig. 3.33(b). The

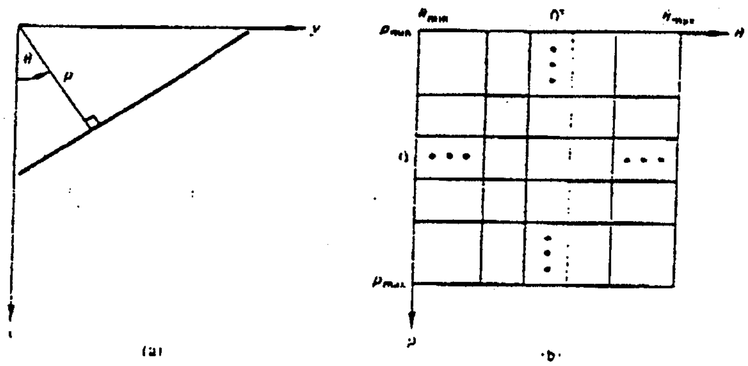

Figure 3.32 (a) Normal representation of a line. (b) Quantization of the $\rho\theta$ plane into cells.

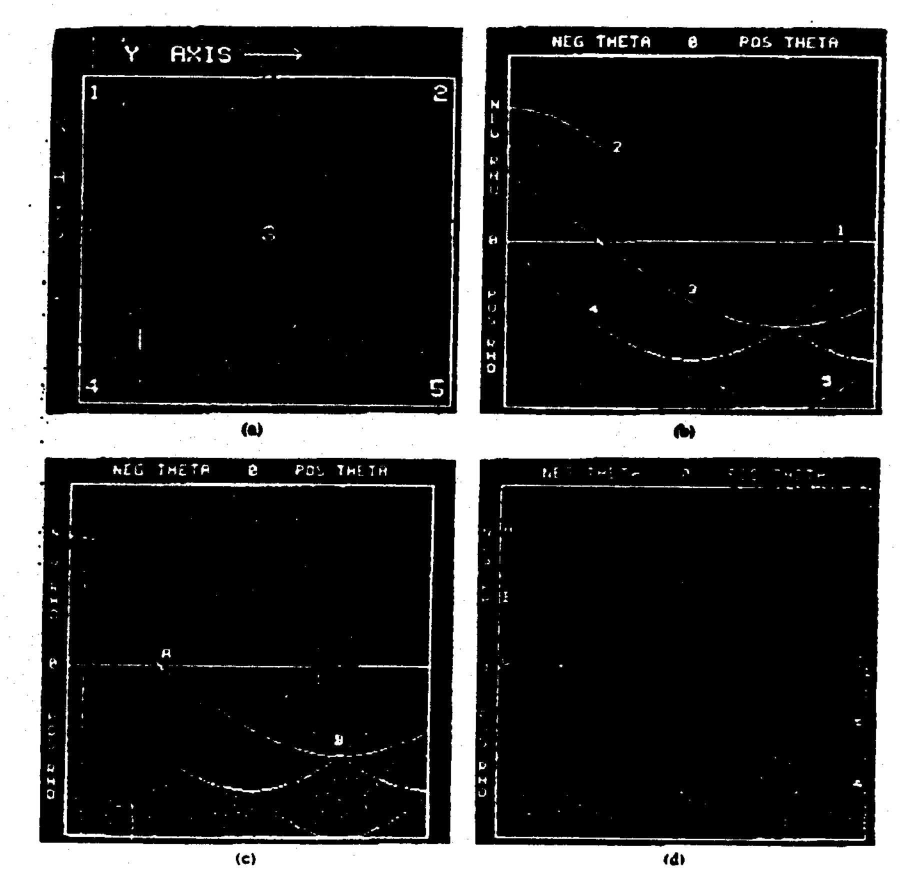

Figure 3.33 Illustration of the Hough transform. (Courtesy of D. R. Cate. Texas Instruments, Inc.)

range of $\theta$ values is $\pm 90°$ and the range of the $\rho$ axis is $\pm\sqrt{2}$ D, where D is the distance between corners in the image. Unlike the transform based on using the slope–intercept, each of these curves has a different sinusoidal shape. (The horizontal line resulting from the mapping of point 1 is a special case of a sinusoid with zero amplitude.) It is noted that, since a point at each extreme of the image was mapped, the Hough transform of any other point in the image would lie between the limits shown in Fig. 3.33(b).

The collinearity detection property of the Hough transform is illustrated in Fig. 3.33(c). Point $A$ denotes the intersection of the curves corresponding to points 1, 3, and 5 in the $xy$ image plane. The location of point $A$ indicates that these three points lie on a straight line passing through the origin ($\rho = 0$) and oriented at $-45°$. Similarly, the curves intersecting at point $B$ in the parameter space indicate that points 2, 3, and 4 lie on a straight line oriented at 45°, and whose distance from the origin is one half the diagonal distance from the origin of the image to the opposite corner.

Finally, Fig. 3.33(d) indicates the fact that the Hough transform exhibits a reflective adjacency relationship at the right and left edges of the parameter space. This property, shown by the points marked $A$, $B$, and $C$ in Fig. 3.33(d), is due to the manner in which $\theta$ and $\rho$ change sign at the $\pm 90°$ boundaries.

Although our attention has been focused thus far on straight lines, the Hough transform is applicable to any function of the form $g(\mathbf{x}, \mathbf{c}) = 0$, where $\mathbf{x}$ is a vector of coordinates and $\mathbf{c}$ is a vector of coefficients. For example, the points lying on the circle $$(x - c_1)^2 + (y - c_2)^2 = c_3^2 \qquad (3.7\text{-}2)$$

can be detected by using the approach discussed above. The basic difference is that we now have three parameters ($c_1$, $c_2$, and $c_3$), which results in a three-dimensional parameter space with cubelike cells and accumulators of the form $A(i, j, k)$. The procedure is to increment $c_1$ and $c_2$, solve for the $c_3$ that satisfies Eq. (3.7-2), and update the accumulator corresponding to the cell associated with the triplet ($c_1$, $c_2$, $c_3$). Clearly, the complexity of the Hough transform is strongly dependent on the number of coordinates and coefficients in a given functional representation.

Before leaving this section, we point out that further generalizations of the Hough transform to detect curves with no simple analytic representations are possible. These concepts, which are extensions of the material presented above, are treated in detail by Ballard [1981].

3.8 CONCLUDING REMARKS

The principal purpose of this chapter has been to present a theoretical foundation of image transforms and their properties. Within this framework, the essential points necessary for a basic understanding of these concepts have been developed and illustrated.

The emphasis placed on the Fourier transform reflects its wide scope of application in image processing problems. The material on the fast Fourier transform is of particular importance because of its computational implications. The separability, centralization, and convolution properties of the Fourier transform will also be used extensively in the following chapters.

Transform theory has played a central role in the development of image processing as a formal discipline, as will be evident in subsequent discussions. In the next chapters, we consider some uses of the Fourier transform for image enhancement and restoration. Further discussions of the Walsh–Hadamard, discrete cosine, and Hotelling transforms is deferred until Chapter 6, where use is made of these transforms for image encoding.

The Hough transform has become increasingly popular in the past few years as a tool for image processing, computer vision, and scene understanding. Use will be made of this transform in Chapter 7 in connection with boundary-oriented segmentation techniques.

REFERENCES

Our treatment of the Fourier transform is of an introductory nature. The classic texts by Titchmarsh [1948] and Papoulis [1962] offer a comprehensive theoretical treatment of the continuous Fourier transform and its properties. The reader will have little difficulty finding additional references in this area. Most engineering circuits and communications books offer a variety of developments and explanations of the Fourier transform. The books by Van Valkenburg [1955], Carlson [1968], and Thomas [1969] are representative.

The derivation of the discrete Fourier transform from its continuous form is also covered extensively in the literature. Three good references on this topic are Blackman and Tukey [1958], Cooley, Lewis, and Welch [1967], and Brigham [1974]. The first and last references are particularly suited for introductory reading.

Formulation of the fast Fourier transform is often credited to Cooley and Tukey [1965]. The FFT, however, has an interesting history worth sketching here. In response to the Cooley–Tukey paper, Rudnick [1966] reported that he was using a similar technique, whose number of operations was also proportional to $N \log_2 N$, and which was based on a method published by Danielson and Lanczos [1942]. These authors, in turn, referenced Runge [1903, 1905] as the source of their technique. The latter two papers, together with the lecture notes of Runge and König [1939], contain the essential computational advantages of present FFT algorithms. Similar techniques were also published by Yates [1937], Stumpff [1939], Good [1958], and Thomas

[1963]. A paper by Cooley, Lewis, and Welch [1967a] presents a historical summary and an interesting comparison of results prior to the 1965 Cooley–Tukey paper.

The FFT algorithm presented in this chapter is by no means a unique formulation. For example, the so-called Sande–Tukey algorithm (Gentleman and Sande [1966]) is based on an alternative decomposition of the input data. The book by Brigham [1974] contains a comprehensive discussion of this algorithm as well as numerous other formulations of the FFT including procedures for bases other than 2.

Although our attention has been focused exclusively on digital techniques, the reader should be aware that two-dimensional Fourier transforms can also be obtained by optical methods. The books by Papoulis [1968], Goodman [1968], and Hech and Zajac [1975] span the theoretical and applied aspects of optics and optical transforms at an introductory level.

Further reading in the matrix formulation of image transforms can be found in the book by Andrews [1970], which also develops the concept of matrix decomposition and discusses other image transforms in addition to the ones covered in this chapter. The papers by Good [1958], Gentleman [1968], and Kahaner [1970] are also of interest.

The original paper on the Walsh transform (Walsh [1923]) is worth reading from a historical point of view. Additional references on the transform are Fine [1949, 1950], Hammond and Johnson [1962], Henderson [1964], Shanks [1969], and Andrews [1970].

Further reading on the Hadamard transform can be found in the original paper by Hadamard [1893], and in Williamson [1944], Whelchel [1968], and Andrews [1970]. Two interesting notes dealing with the search for Hadamard matrices based on other than integer powers of 2 are Baumert [1962], and Golomb [1963]. The concept of sequency appears to have been introduced by Harmuth [1968]. References for the discrete cosine transform are Ahmed *et al.* [1974] and Ahmed and Rao [1975]. The latter reference also contains an extensive discussion of other orthogonal transforms.

Hotelling [1933] was the first to derive and publish the transformation that transforms discrete variables into uncorrelated coefficients. He referred to this technique as *the method of principal components*. His paper gives considerable insight into the method and is worth reading. Hotelling's transformation was rediscovered by Kramer and Mathews [1956] and Huang and Schultheiss [1963]. See Lawley and Maxwell [1963] for a general discussion of this topic.

The analogous transformation for transforming continuous data into a set of uncorrelated coefficients was discovered by Karhunen [1947] and Loève [1948] and is called the *Karhunen-Loève expansion*. See Selin [1965] for an excellent discussion. The result that the Karhunen-Loève expansion minimizes the mean-square truncation error was first published by Koschmann [1954] and rediscovered by Brown [1960].

The Hough transform was first proposed by P. V. C. Hough [1962] in a U.S. patent, and later popularized by Duda and Hart [1972]. A generalization of the Hough transform for detecting arbitrary shapes has been proposed by Ballard [1981]. The Hough transform has found applicability in areas such as biomedical image processing (Kimme *et al.* [1975], Wechsler and Slansky [1977]), scene understanding (O'Gorman and Clowes [1976], Dudani and Luk [1977]), target tracking (Falconer [1977]), object inspection (Dyer [1983]), and character recognition (Kushnir *et al.* [1985]). Methods for reducing computational complexity have been investigated by Merlin and Farber [1975], and Davis [1982].

PROBLEMS

3.1 a) Starting with Eq. (3.1-9), show that the Fourier transform of the two-dimensional sinusoidal function $n(x, y) = A \sin(u_0 x + v_0 y)$ is $N(u, v) = -jA/2[\delta(u - u_0/2\pi, v - v_0/2\pi) - \delta(u + u_0/2\pi, v + v_0/2\pi)]$.

b) Obtain the spectrum of $N(u, v)$.

3.2 A real function $f(x)$ can be decomposed as the sum of an even function and an odd function.

a) Show that $f_{even}(x) = \frac{1}{2}[f(x) + f(-x)]$ and $f_{odd}(x) = \frac{1}{2}[f(x) - f(-x)]$.

b) Show that $\mathfrak{F}[f_{even}(x)] = \mathrm{Re}\{\mathfrak{F}[f(x)]\}$ and $\mathfrak{F}[f_{odd}(x)] = j\mathrm{Im}\{\mathfrak{F}[f(x)]\}$.

3.3 Show that the Fourier transform of the autocorrelation function of $f(x)$ is the power spectrum (spectral density) $|F(u)|^2$.

3.4 Show the validity of Eqs. (3.3-7a) and (3.3-7b).

3.5 Obtain the Fourier transforms of (a) $df(x)/dx$, (b) $[\partial f(x, y)/\partial x - \partial f(x, y)/\partial y]$, and (c) $[\partial^2 f(x, y)/\partial x^2 + \partial^2 f(x, y)/\partial y^2]$. Assume that $x$ and $y$ are continuous variables.

3.6 Show that the discrete Fourier transform and its inverse are periodic functions. For simplicity, assume one-dimensional functions.

3.7 Show that the Fourier transform of the convolution of two functions is the product of their Fourier transforms. For simplicity, assume functions of one variable.

3.8 As indicated in Section 3.4.2, it takes $N \log_2 N$ additions and $\frac{1}{2}N \log_2 N$ multiplications to compute the FFT of $N$ points. How many additions and multiplications would it take to compute the two-dimensional FFT of an $N \times N$ image?

3.9 With reference to the discussion in Section 3.4.1, show that a) $W_{2M}^{2ux} = W_M^{ux}$.

b) $W_M^{u-M} = W_M^u$.

c) $W_{2M}^{u+M} = -W_{2M}^u$.

3.10 Numerous available FFT computer programs are restricted to one-dimensional, *real* data inputs. (a) Show how such an algorithm could be used to compute the FFT of one-dimensional *complex* data. (b) What would be the procedure for using such an algorithm to compute the two-dimensional FFT of an image whose pixels are real numbers?

3.11 With reference to Table 3.2, how would you order a 16-point array for use with a successive-doubling FFT algorithm?

3.12 Show that Eqs. (3.5-15) and (3.5-17) constitute a transform pair (i.e., they are inverses of each other).

3.13 For a set of images of size 64 × 64, assume that the covariance matrix given in Eq. (3.6-11) turns out to be the identity matrix. What would be the mean square error between the original images and images reconstructed using Eq. (3.6-13) with only half of the original eigenvectors?

3.14 a) Explain why the Hough mapping of point 1 in Fig. 3.33(b) is a straight line.
b) Is this the only point that would produce this result?
c) Explain the reflective adjacency relationship illustrated in Fig. 3.33(d).

3.15 a) Develop a general procedure for obtaining the normal representation of a line given its slope-intercept equation $y = ax + b$.
b) Find the normal representation of the line $y = -2x + 1$.

We claim:

1. A method for calibrating a color pipeline including at least one initial color processing unit, an intermediate color processing unit and a final color processing unit, the method comprising the steps of:

comparing a first output representation of a first reference color image to a first target representation thereof and calibrating the final color processing unit in accordance with the comparison;

processing a second input representation of a second reference color image using a pipeline comprising the intermediate color processing unit and the calibrated final color processing unit, thereby to define a second output representation of the second reference color image;

comparing the second output representation to a second target representation of the second reference color image and calibrating the intermediate color processing unit in accordance with the comparison;

processing a third input representation of a third reference color image using a pipeline comprising the calibrated intermediate and final color processing units, thereby to define a third output representation of the third reference color image; and comparing the third output representation to a third target representation of the third reference color image and calibrating at least one of the uncalibrated initial color processing units in accordance with the comparison.

2. A method according to claim 1 and also comprising the step of processing a first input representation of a first reference color image using the final color processing unit, thereby to generate the first output representation.

3. Apparatus for calibrating a color processing pipeline including at least one initial color processing unit, an intermediate color processing unit and a final color processing unit, the apparatus comprising:

a comparison unit operative to generate first, second and third comparison outputs by respectively comparing first, second and third output representations of first, second and third reference color images, respectively, to first, second and third target representations of the first, second nd third reference color images, respectively, the first output representation being generated by processing a first input representation of the first reference color image using the final color processing unit; and a calibration unit operative to calibrate the final color processing unit in accordance with the first comparison output, to subsequently calibrate the intermediate color processing unit in accordance with the second comparison output, and to subsequently calibrate an initial color processing unit in accordance with the third calibration output, wherein the second output representation is generated by processing a second input representation of the second reference color image using the calibrated final color processing unit, and the third output representation is generated by processing a third input representation of the third reference color image using a pipeline comprising the calibrated intermediate and final color processing units.

4. A method according to claim 1 wherein the final color processing unit comprises a calibratable subunit and a color output device downstream thereof.

5. A method according to claim 1 wherein the reference color processing device comprises a color output system.

* * * * *